US005588139A

United States Patent [19]

Lanier et al.

[11] Patent Number: 5,588,139

[45] Date of Patent: Dec. 24, 1996

[54] METHOD AND SYSTEM FOR GENERATING OBJECTS FOR A MULTI-PERSON VIRTUAL WORLD USING DATA FLOW NETWORKS

[75] Inventors: Jaron Z. Lanier, Palo Alto; Jean-Jacques G. Grimaud, Portola Valley; Young L. Harvill; Ann Lasko-Harvill, both of San Mateo; Chuck L. Blanchard, Palo Alto; Mark L. Oberman, Mountain View; Michael A. Teitel, La Honda, all of Calif.

[73] Assignee: VPL Research, Inc., Redwood City, Calif.

[21] Appl. No.: 133,802

[22] Filed: Oct. 8, 1993

Related U.S. Application Data

[63] Continuation of Ser. No. 535,253, Jun. 7, 1990, abandoned.

[51] Int. Cl.[6] ..................... G06F 9/455

[52] U.S. Cl. ..................... 395/500; 364/DIG. 1

[58] Field of Search ..................... 395/119, 159, 395/500; 364/709.01; 345/7, 8, 9

[56] References Cited

U.S. PATENT DOCUMENTS

| | | |
|---|---|---|
| 1,335,272 | 3/1920 | Broughton . |
| 2,356,267 | 8/1944 | Pelunis . |
| 3,510,210 | 5/1970 | Haney . |
| 3,777,086 | 12/1973 | Riedo . |
| 4,059,830 | 11/1977 | Threadgill . |
| 4,074,444 | 2/1978 | Laenger, Sr. et al. . |
| 4,209,255 | 6/1980 | Heynau et al. . |
| 4,302,138 | 11/1981 | Zarudiansky . |
| 4,355,805 | 10/1982 | Baer et al. . |

(List continued on next page.)

FOREIGN PATENT DOCUMENTS

| | | |
|---|---|---|
| 3442549 | 11/1984 | Germany . |
| 3334395 | 4/1985 | Germany . |
| 1225525 | 4/1986 | U.S.S.R. . |

OTHER PUBLICATIONS

"Digital Actuator Utilizing Shape Memory Effect," Honma, et al. Lecture given at 30th Anniversary of Tokai Branch foundation on Jul. 14, 1981, pp. 1–22.

"Micro Manipulators Applied Shape Memory Effect," Honma, et al. Paper presented at 1982 Precision Machinery Assoc. Autumn Conference on Oct. 20, pp. 1–21. (Aso in Japanese).

"Magnetoelastic Force Feedback Sensors for Robots and Machine Tools," John M. Vranish, National Bureau of Standards, Code 738.03, pp. 253–263.

"Analysis of Muscle Open and Closed Loop Recruitment Forces: A Preview to Synthetic Proprioception," Solomonow, et al., IEEE Frontiers of Engineering and Computing in Health Care, 1984, pp. 1–3.

"Shape Memory Effect Alloys for Robotic Devices," Schetky, L., Robotics Age, Jul. 1984, pp. 13–17.

"Laboratory Profile," R & D Frontiers, pp. 1–12.

"Hitachi's Robot Hand," Nakano, et al., Robotics Age, Jul. 1984, pp. 18–20.

(List continued on next page.)

*Primary Examiner*—William M. Treat
*Attorney, Agent, or Firm*—Oblon, Spivak, McClelland, Maier & Neustadt, P.C.

[57] ABSTRACT

A computer model of a virtual environment is continuously modified by input from various participants. The virtual environment is displayed to the participants using sensory displays such as head-mounted visual and auditory displays which travel with the wearer and track the position and orientation of the wearer's head in space. Participants can look at each other within the virtual environment and see virtual body images of the other participants in a manner similar to the way that people in a physical environment see each other. Each participant can also look at his or her own virtual body in exactly the same manner that a person in a physical environment can look at his or her own real body. The participants may work on a common task together and view the results of each other's actions.

30 Claims, 7 Drawing Sheets

U.S. PATENT DOCUMENTS

| | | | |
|---|---|---|---|
| 4,408,495 | 10/1983 | Couch et al. . | |
| 4,414,537 | 11/1983 | Grimes . | |
| 4,414,984 | 11/1983 | Zarudiansky . | |
| 4,524,348 | 6/1985 | Lefkowitz . | |
| 4,540,176 | 9/1985 | Baer . | |
| 4,542,291 | 9/1985 | Zimmerman . | |
| 4,544,988 | 10/1985 | Hochstein . | |
| 4,553,393 | 11/1985 | Ruoff . | |
| 4,558,704 | 12/1985 | Petrofsky . | |
| 4,565,999 | 1/1986 | King et al. . | |
| 4,569,599 | 2/1986 | Bölkow et al. . | |
| 4,579,006 | 4/1986 | Hosoda et al. . | |
| 4,581,491 | 4/1986 | Boothroyd . | |
| 4,586,335 | 5/1986 | Hosoda et al. . | |
| 4,586,387 | 5/1986 | Morgan et al. . | |
| 4,613,139 | 9/1986 | Robinson, II . | |
| 4,634,856 | 1/1987 | Kirkham . | |
| 4,654,520 | 3/1987 | Griffiths . | |
| 4,654,648 | 3/1987 | Herrington et al. . | |
| 4,660,033 | 4/1987 | Brandt . | |
| 4,665,388 | 5/1987 | Ivie et al. . | |
| 4,682,159 | 7/1987 | Davison . | |
| 4,715,235 | 12/1987 | Fukui et al. . | |
| 4,771,543 | 12/1987 | Blair et al. . | |
| 4,807,202 | 2/1989 | Cherri et al. | 367/129 |
| 4,843,568 | 6/1989 | Krueger et al. | 364/518 |
| 4,857,902 | 8/1989 | Naimark et al. | 340/709 |
| 4,884,219 | 11/1989 | Waldern | 364/514 |
| 4,905,001 | 2/1990 | Penner | 341/20 |
| 4,984,179 | 1/1991 | Waldern | 364/514 |
| 4,988,981 | 1/1991 | Zimmerman et al. | 340/709 |

OTHER PUBLICATIONS

"Virtual Environment Display System," Fisher, et al., ACM 1986 Workshop on Interactive 3D Graphics, Oct. 23–24, 1986, Chapel Hill, N. Carolina, pp. 1–11.

"The Human Interface in Three Dimensional Computer Art Space," by Jennifer A. Hall, B.F.A. Kansas City Art Institute 1980, pp. 1–68.

"Human Body Motion as Input to an Animated Graphical Display," by Carol Marsha Ginsberg, B.S., Massachusetts Institute of Technology 1981, pp. 1–88.

"Put–That–There: Voice and Gesture at the Graphics Interface," by Richard A. Bolt, Massachusetts Institute of Technology 1980.

"Proceedings, SPIE Conference on Processing and Display of Three–Dimensional Data–Interactive Three–Dimensional Computer Space," by Christopher Schmandt, Massachusetts Institute of Technology 1982.

Fisher et al., "Virtual Environment Display System", *ACm Workshop on Interactive 3D Graphics*, Oct. 23–24, 1986, Chapel Hill, N.C., pp. 1–11.

Steve Ditler, "Another World: Inside Artificial Reality," PC Computing, Nov. 1989, vol. 2, nr. 11, p. 90 (12).

METHOD AND SYSTEM FOR GENERATING OBJECTS FOR A MULTI-PERSON VIRTUAL WORLD USING DATA FLOW NETWORKS

This application is a Continuation of application Ser. No. 07/535,253, filed on Jun. 7, 1990, now abandoned.

BACKGROUND OF THE INVENTION

This invention relates to computer systems and, more particularly, to a network wherein multiple users may share, perceive, and manipulate a virtual environment generated by a computer system.

Researchers have been working with virtual reality systems for some time. In a typical virtual reality system, people are immersed in three-dimensional, computer-generated worlds wherein they control the computer-generated world by using parts of their body, such as their hands, in a natural manner. Examples of virtual reality systems may be found in telerobotics, virtual control panels, architectural simulation, and scientific visualization. See, for example, Sutherland, W. R., "The Ultimate Display", Proceedings of the IPIP Congress 2, 506–508 (1965); Fisher, S. S., McGreevy, M., Humphries, J., and Robbinett, W., "Virtual Environment Display System," Proc. 86 Workshop 3D Graphics, 77–87 (1986); F. P. Brooks, "Walkthrough—A Dynamic Graphics System for Simulating Virtual Buildings", Proc. 1986 Workshop on Interactive 3D Graphics, 9–12 (1986); and Chung, J. C., "Exploring Virtual Worlds with Head-Mounted Displays", Proc. SPIE Vol. 1083, Los Angeles, Calif., (1989). All of the foregoing publications are incorporated herein by reference.

In known systems, not necessarily in the prior art, a user wears a special helmet that contains two small television screens, one for each eye, so that the image appears to be three dimensional. This effectively immerses the user in a simulated scene. A sensor mounted on the helmet keeps track of the position and orientation of the users head. As the user's head turns, the computerized scene shifts accordingly. To interact with objects in the simulated world, the user wears an instrumented glove having sensors that detect how the hand is bending. A separate sensor, similar to the one on the helmet, determines the hand's position in space. A computer-drawn image of a hand appears in the computerized scene, allowing the user to guide the hand to objects in the simulation. The virtual hand emulates the movements of the real hand, so the virtual hand may be used to grasp and pick up virtual objects and manipulate them according to gestures of the real hand. An example of a system wherein the gestures of a part of the body of the physical user is used to create a cursor which emulates the part of the body for manipulating virtual objects is disclosed in copending U.S. patent application Ser. No. 317,107, filed Feb. 28, 1989, U.S. Pat .No. 4,988,981, issued Jan. 29, 1991, entitled, "Computer Data Entry Manipulation Apparatus and Method," incorporated herein by reference.

To date, known virtual reality systems accommodate only a single user within the perceived virtual space. As a result, they cannot accommodate volitional virtual interaction between multiple users.

SUMMARY OF THE INVENTION

The present invention is directed to a virtual reality network which allows multiple participants to share, perceive, and manipulate a common virtual or imaginary environment. In one embodiment of the present invention, a computer model of a virtual environment is continuously modified by input from various participants. The virtual environment is displayed to the participants using sensory displays such as head-mounted visual and auditory displays which travel with the wearer and track the position and orientation of the wearer's head in space. Participants can look at each other within the virtual environment and see virtual body images of the other participants in a manner similar to the way that people in a physical environment see each other. Each participant can also look at his or her own virtual body in exactly the same manner that a person in a physical environment can look at his or her own real body. The participants may work on a common task together and view the results of each other's actions.

BRIEF DESCRIPTION OF THE APPENDICES

Figure 1:
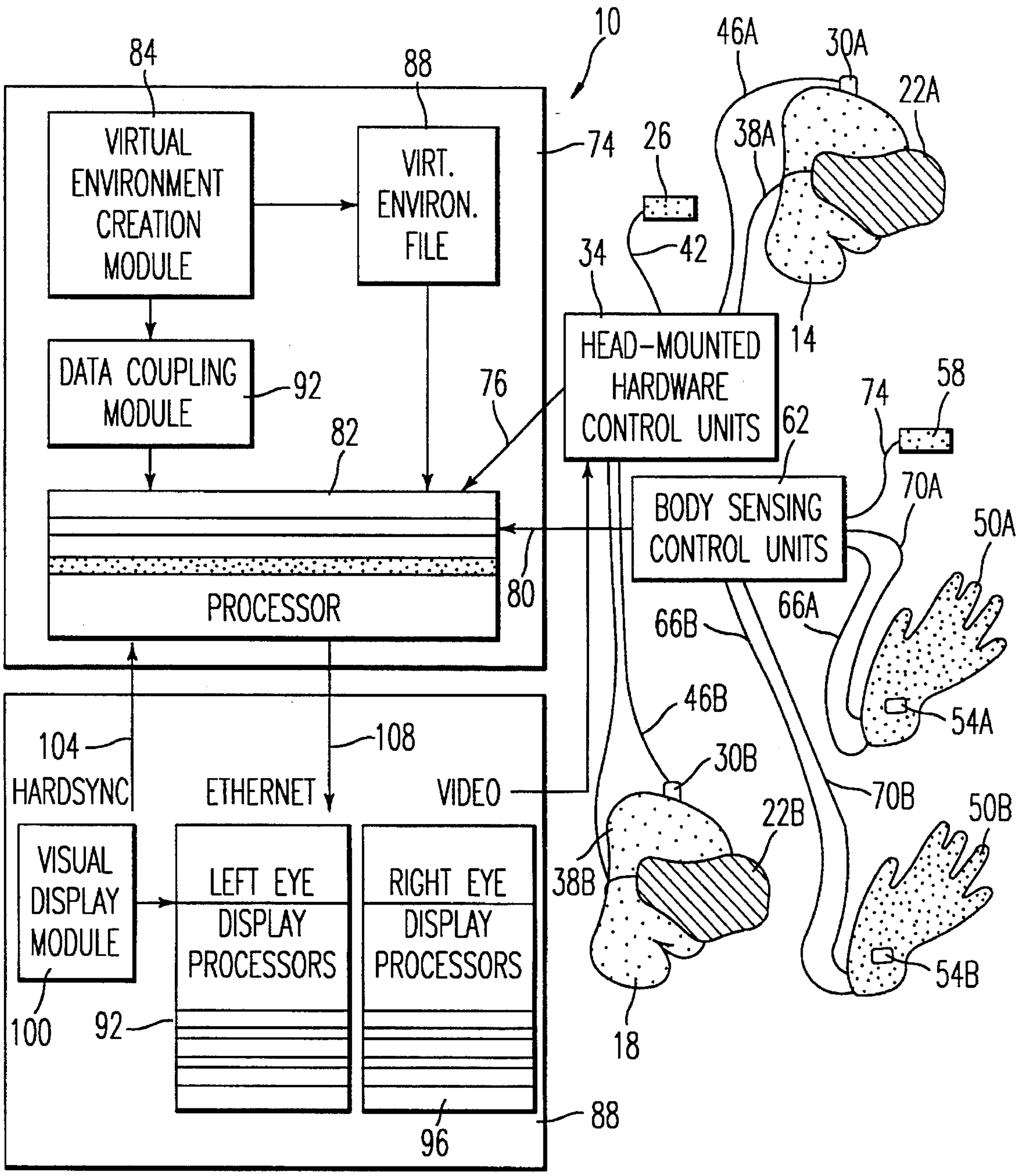
FIG. 1 is a diagram of a particular embodiment of a virtual reality network according to the present invention.

App. 1 is a computer program listing for the virtual environment creation module shown in FIG. 1;

App. 2 is a computer program listing for the Data coupling module shown in FIG. 1; and App. 3 is a computer program listing for the visual display module shown in FIG. 1.

DETAILED DESCRIPTION OF THE PREFERRED EMBODIMENT

FIG. 1 is a diagram showing a particular embodiment of a virtual reality network 10 according to the present invention. In this embodiment, a first participant 14 and a second participant 18 share and experience the virtual environment created by virtual reality network 10. First participant 14 wears a head-mounted display 22(A) which projects the virtual environment as a series of image frames much like a television set. Whether or not the helmet completely occludes the view of the real world depends on the desired effect. For example, the virtual environment could be superimposed upon a real-world image obtained by cameras located in close proximity to the eyes. Head-mounted display 22(A) may comprise an EyePhone™ display available from VPL Research, Inc. of Redwood City, Calif. An electromagnetic source 26 communicates electromagnetic signals to an electromagnetic sensor 30(A) disposed on the head (or head-mounted display) of first participant 14. Electromagnetic source 26 and electromagnetic sensor 30(A) track the position of first participant 14 relative to a reference point defined by the position of electromagnetic source 26. Electromagnetic source 26 and electromagnetic sensor 30(A) may comprise a Polhemus Isotrak™ available from Polhemus Systems, Inc. Head-mounted display 22(A), electromagnetic source 26, and electromagnetic sensor 30(A) are coupled to a head-mounted hardware control unit 34 through a display bus 38(A), a source bus 42(A), and a sensor bus 46(A), respectively.

First participant 14 also wears an instrumented glove assembly 50(A) which includes an electromagnetic sensor 54 for receiving signals from an electromagnetic source 58. Instrumented glove assembly 50(A), electromagnetic sensor 54(A) and electromagnetic source 58 are used to sense the position and orientation of instrumented glove 50 relative to a reference point defined by the location of electromagnetic source 58. In this embodiment, instrumented glove assembly 50(A), electromagnetic sensor 54(A) and electromagnetic source 58 are constructed in accordance with the teachings of copending patent application Ser. No. 317,107 entitled "Computer Data Entry and Manipulation Apparatus and Method." More particularly, instrumented glove assembly 50(A), electromagnetic sensor 54(A) and electromagnetic source 58 may comprise a DataGlove™ available from VPL Research, Inc. Instrumented glove assembly 50(A), electromagnetic sensor 54(A), and electromagnetic source 58 are coupled to a body sensing control unit 62 through a glove bus 66, a sensor bus 70, and a source bus 74, respectively.

Although only an instrumented glove assembly is shown in FIG. 1, it should be understood that the position and orientation of any and all parts of the body of the user may be sensed. Thus, instrumented glove 50 may be replaced by a full body sensing suit such as the DataSuit™, also available from VPL Research, Inc., or any other body sensing device.

In the same manner, second participant 18 wears a head-mounted display 22(*b*) and an electromagnetic sensor 30(*b*) which are coupled to head-mounted hardware control unit 34 through a display bus 38(*b*) and a sensor bus 46(*b*), respectively. Second participant 18 also wears an instrumented glove assembly 50(*b*) and an electromagnetic sensor 54(*b*) which are coupled to body sensing control unit 62 through a glove bus 66(*b*) and a sensor bus 70(*b*).

In this embodiment, there is only one head-mounted hardware control unit 34, body sensing control unit 62, electromagnetic source 26, and electromagnetic source 58 for both participants. However, each participant may be located separately from each other, in which case each participant would have his or her own head-mounted hardware control unit 34, body sensing control unit 62, electromagnetic source 26, and/or electromagnetic sensor 58.

The position and orientation information received by head-mounted control unit 34 are communicated to a virtual environment data processor 74 over a head-mounted data bus 76. Similarly, the position and orientation information received by body sensing control unit 62 are communicated to virtual environment data processor 74 over a body sensing data bus 80. Virtual environment data processor 74 creates the virtual environment and superimposes or integrates the data from head-mounted hardware control unit 34 and body sensing control unit 62 onto that environment.

Virtual environment data processor 74 includes a processor 82 and a virtual environment creation module 84 for creating the virtual environment including the virtual participants and/or objects to be displayed to first participant 14 and/or second participant 18. Virtual environment creation module 84 creates a virtual environment file 88 which contains the data necessary to model the environment. In this embodiment, virtual environment creation module 84 is a software module such as RB2SWIVEL™, available from VPL Research, Inc. and included in app. 1.

A data coupling module 92 receives the virtual environment data and causes the virtual environment to dynamically change in accordance with the data received from head-mounted hardware control unit 34 and body sensing control unit 62. That is, the virtual participants and/or objects are represented as cursors within a database which emulate the position, orientation, and other actions of the real participants and/or objects. The data from the various sensors preferably are referenced to a common point in the virtual environment (although that need not be the case). In this embodiment, data coupling module 92 is a software module such as BODY ELECTRIC™, available from VPL Research, Inc. and included in app. 2.

Figure 2:
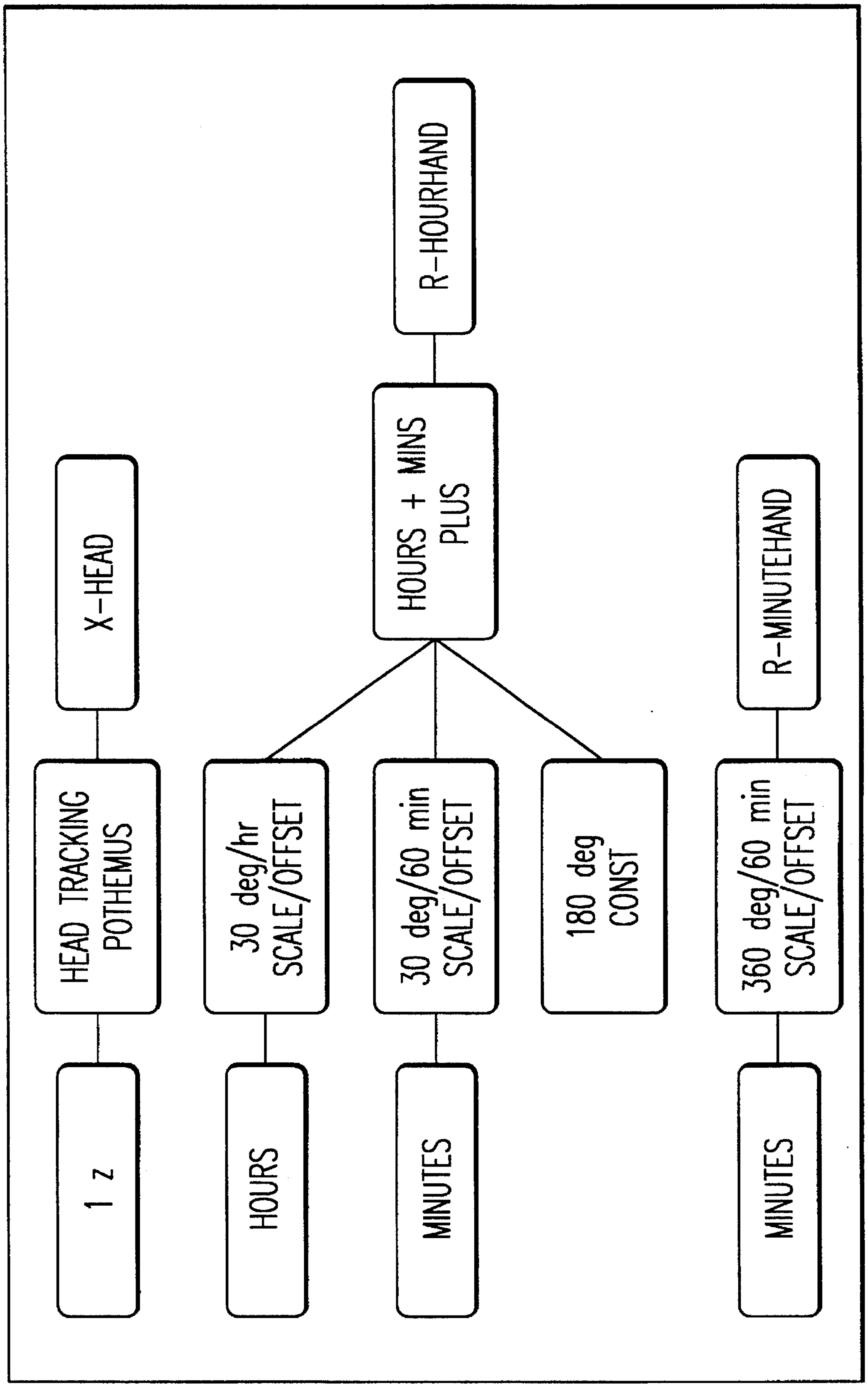
FIG. 2 is a diagram of a data flow network for coupling real world data to a virtual environment.

FIG. 2 shows an example of a simple data flow network for coupling data from the head of a person in the real world to their virtual head. Complex interactions such as hit testing, grabbing, and kinematics are implemented in a similar way. The data flow network shown in FIG. 2 may be displayed on a computer screen and any parameter edited while the virtual world is being simulated. Changes made are immediately incorporated into the dynamics of the virtual world. Thus, the participants are given immediate feedback about the world interactions he or she is developing. The preparation of a data flow network comprises two different phases: (1) creating a point hierarchy for each object to be displayed in the virtual world and (2) interconnecting input units, function units and output units to control the flow/transformation of data. Each function unit outputs a position value (x, y or z) or orientation value (yaw, pitch or roll) for one of the points defined in the point hierarchy. As shown in FIG. 2, the top and bottom input units are connected to first and second function units to produce first and second position/orientation values represented by first and second output units ("x-Head" and "R-minutehan"). The middle two inputs of FIG. 2 are connected to third and fourth function units, the outputs of which are combined with the output from a fifth function unit, a constant value function unit, to create a third position/orientation value represented by a third output unit (R-hourhand), which is the output of a sixth function unit.

Figure 3:
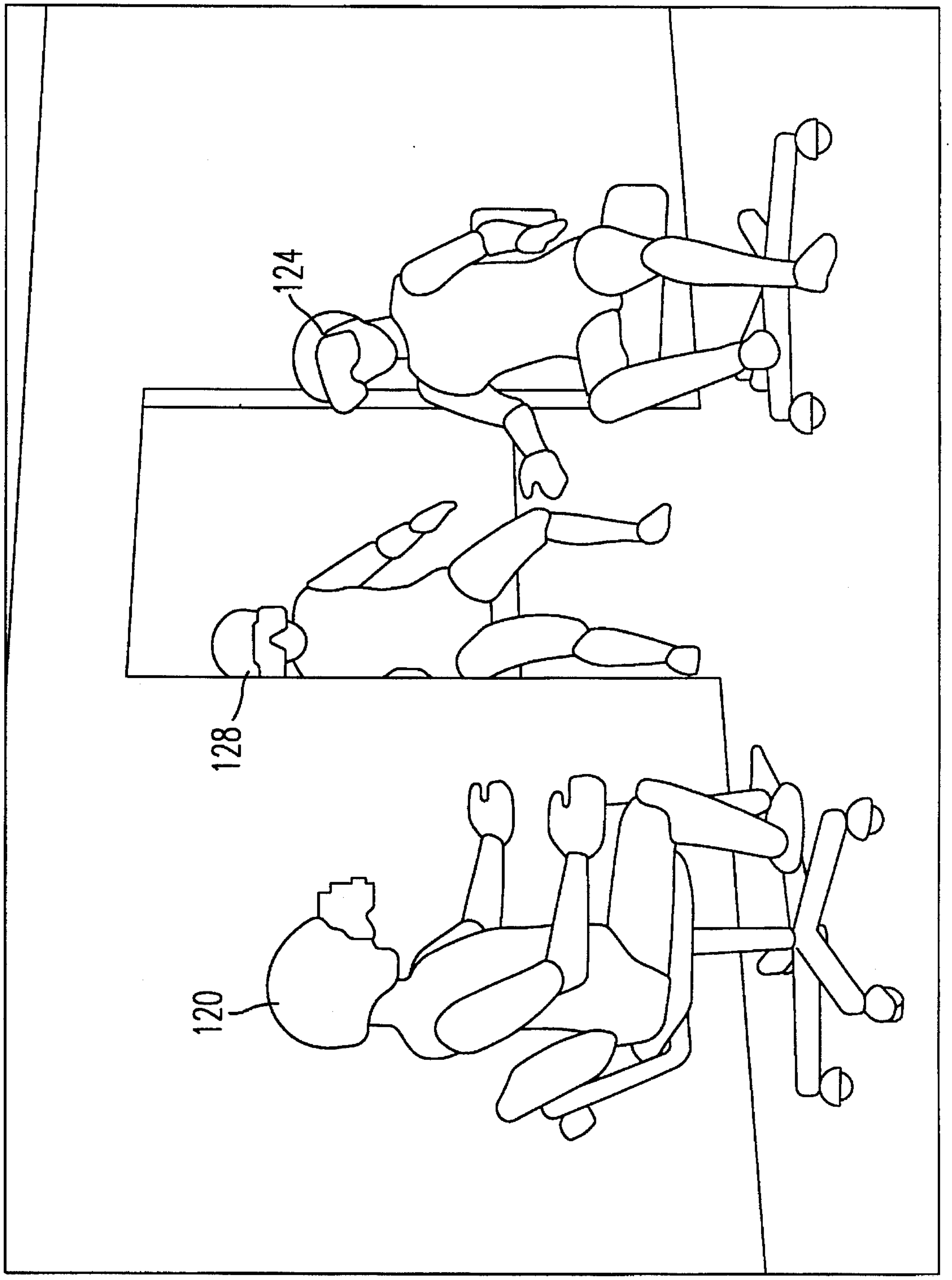
FIG. 3 is a diagram showing three participants of a virtual reality experience.
Figure 7:
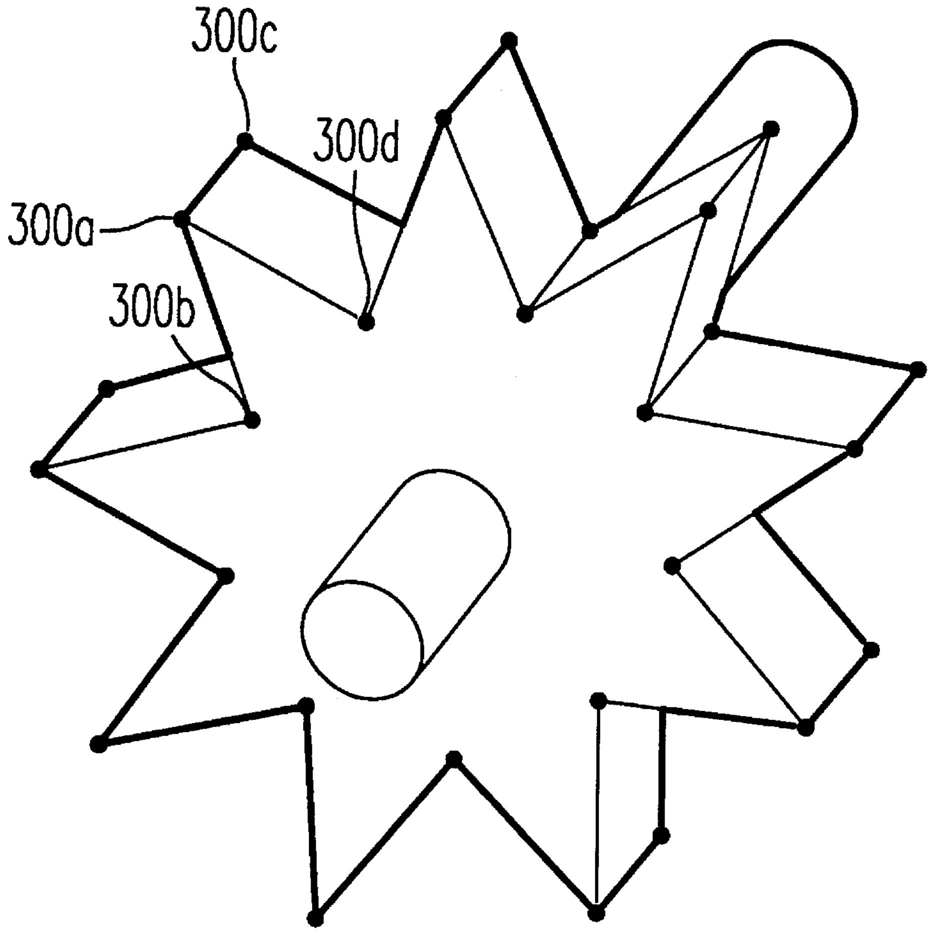
FIG. 7 is a schematic illustration depicting a point hierarchy that creates one of the gears of the virtual world shown in FIG. 3.

As shown in FIG. 7, one of the gears of FIG. 3 is described as a hierarchy of points. Choosing point **300*a* as a beginning point, child points, 300*b*, 300*c* and 300*d*, are connected to their parent point, 300*a*,** by specifying the position and orientation of each child point with respect to the parent point. By describing the relationship of some points to other points through the point hierarchy, the number of relationships to be described by the input units, function units, and output units is reduced, thereby reducing development time for creating new virtual worlds.

Having connected the data flow network as desired, input data from sensors (including the system clock) are fed into the data flow network. When an output corresponding to one of the points changes, the modified position or orientation of the point is displayed to any of the users looking at the updated point. In addition, the system traverses the hierarchy of points from the updated points "downward" in the tree in order to update the points whose positions or orientations depend on the repositioned or reoriented point. These points are also updated in the views of the users looking at these points.

The animated virtual environment is displayed to first participant 14 and second participant 18 using a virtual environment display processor 88. In this embodiment, virtual environment display processor 88 comprises one or more left eye display processors 92, one or more right eye display processors 96, and a virtual display module 100. In this embodiment, each head-mounted display 22(*a*), 22(*b*) has two display screens, one for each eye. Each left eye display processor 92 therefore controls the left eye display for a selected head mounted display, and each right eye display processor 96 controls the right eye display for a selected head mounted display. Thus, each head mounted display has two processors associated with it. The image (viewpoint) presented to each eye is slightly different so as to closely approximate the virtual environment as it would be seen by real eyes. Thus, the head mounted displays 22(A) and 22(B) produce stereophonic images. Each set of processors 92, 96 may comprise one or more IRIS™ processors available from Silicon Graphics, Inc.

The animated visual environment is displayed by a series of image frames presented to each display screen within head-mounted displays 22(*a*) and 22(*b*). These frames are computed by a visual display module 100 which runs on each processor 92, 96. In this embodiment, visual display module 108 comprises a software module such as ISAAC™, available from VPL Research, Inc. and included in app. 3.

In this embodiment, only the changed values within each image frame are communicated from processor 82 to left eye display processors 92 and right eye display processors 96 over an Ethernet bus 108. After the frames for each eye are computed, a synchronization signal is supplied to processor 82 over a hard-sync bus 104. This informs processor 82 that the next image frame is to be calculated, and processor 82 then communicates the changed values needed to calculate the next frame. Meanwhile, the completed image frames are communicated to head-mounted hardware control unit 34 over a video bus 112 so that the image data may be communicated to head-mounted displays 22(*a*) and 22(*b*).

Figure 4:
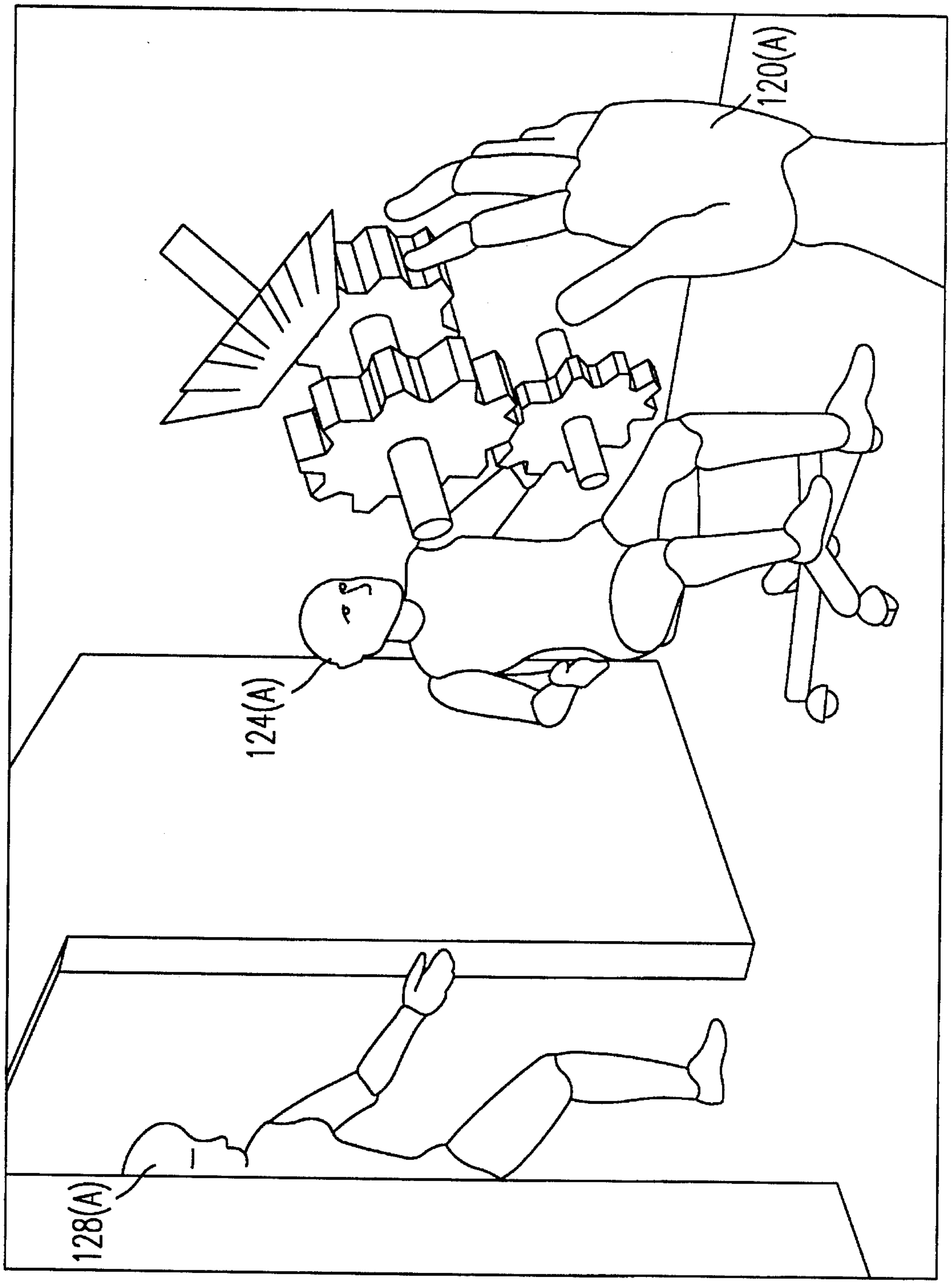
FIG. 4 is a diagram showing a virtual environment as perceived by one of the participants shown in FIG. 2.
Figure 5:
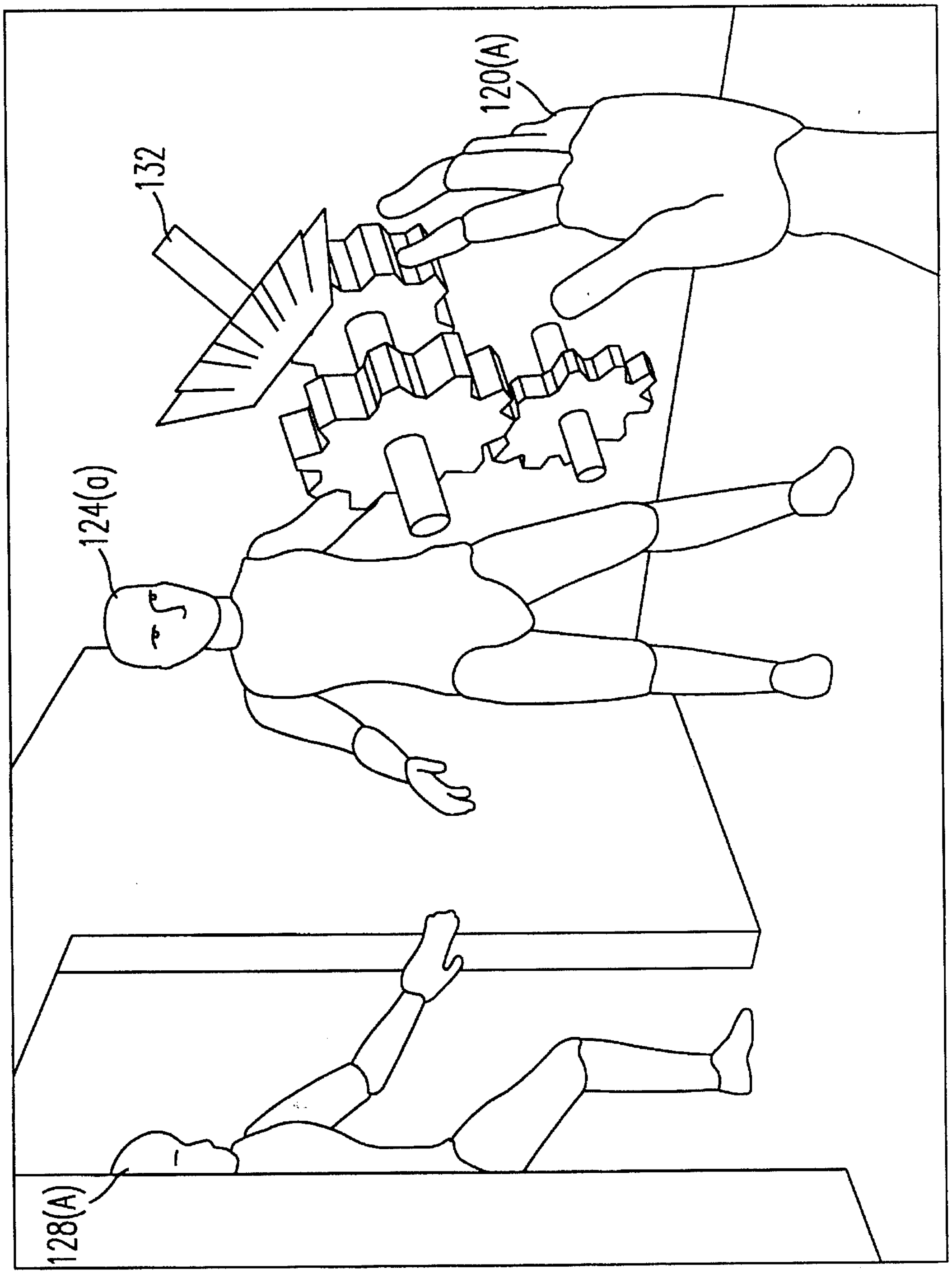
FIG. 5 is a diagram showing an alternative embodiment of a virtual environment as perceived by one of the participants shown in FIG. 2.

FIG. 3 is a diagram of virtual reality network 10 as used by three participants 120, 124 and 128, and FIGS. 3 and 4 provide examples of the virtual environment as presented to two of the participants. As shown in FIGS. 3–5, participants 120 and 124 engage in a common activity whereas participant 128 merely watches or supervises the activity. In this example, and as shown in FIGS. 4 and 5, the activity engaged in is an engineering task on a virtual machine 132 wherein virtual machine 132 is manipulated in accordance with the corresponding gestures of participants 120 and 124. FIG. 4 shows the virtual environment as displayed to participant 120. Of course, the other participants will see the virtual environment from their own viewpoints or optical axes. In this embodiment, the actions of the participants shown in FIG. 3 are converted into corresponding actions of animated participants 120(A), 124(A) and 128(*a*), and the virtual environment is created to closely match the real environment.

A unique aspect of the present invention is that the appearance and reactions of the virtual environment and virtual participants are entirely within the control of the user. As shown in FIG. 5, the virtual environment and actions of the virtual participants need not correspond exactly to the real environment and actions of the real participants. Furthermore, the virtual participants need not be shown as humanoid structures. One or more of the virtual participants may be depicted as a machine, article of manufacture, animal, or some other entity of interest. In the same manner, virtual machine 132 may be specified as any structure of interest and need not be a structure that is ordinarily perceivable by a human being. For example, structure 132 could be replaced with giant molecules which behave according to the laws of physics so that the participants may gain information on how the molecular world operates in practice.

It should also be noted that the real participants need not be human beings. By using suitable hardware in processor 82, such as the MacADIOS™ card available from GW Instruments, Inc. of Summerville, Mass., any real-world data may be modeled within the virtual environment. For example, the input data for the virtual environment may consist of temperature and pressure values which may be used to control virtual meters displayed within the virtual environment. Signals from a tachometer may be used to control the speed of a virtual assembly line which is being viewed by the participants.

Viewpoints (or optical axes) may be altered as desired. For example, participant 128 could share the viewpoint of participant 120 (and hence view his or her own actions), and the viewpoint could be taken from any node or perspective (e.g., from virtual participant 120(A)'s knee, from atop virtual machine 132, or from any point within the virtual environment).

Figure 6:
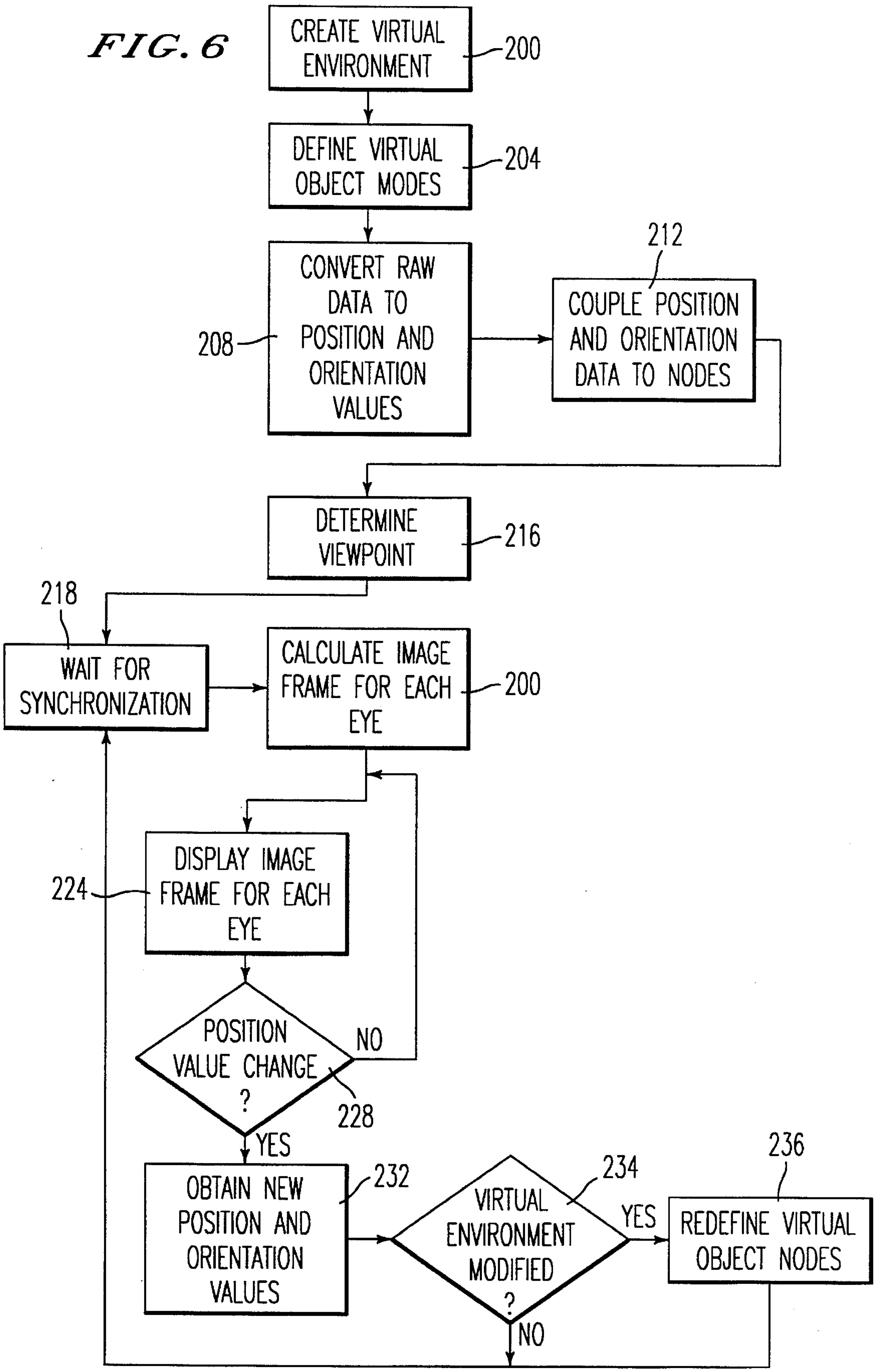
FIG. 6 is a flowchart showing the operation of a particular embodiment of a virtual reality network according to the present invention.

FIG. 6 is a flowchart illustrating the operation of a particular embodiment of virtual reality network 10. The virtual environment is created in a step 200, and then nodes on the virtual objects within the virtual environment are defined in a step 204. The raw data from head-mounted hardware control unit 34 and body sensing control unit 62 are converted to position and orientation values in a step 208, and the position and orientation data is associated with (or coupled to) the nodes defined in step 204 in a step 212. Once this is done, processors 92 and 96(*a*) may display the virtual objects (or participants) in the positions indicated by the data. To do this, the viewpoint for each participant is computed in a step 216. The system then waits for a synchronization signal in a step 218 to ensure that all data necessary to compute the image frames are available. Once the synchronization signal is received, the image frame for each eye for each participant is calculated in a step 220. After the image frames are calculated, they are displayed to each participant in a step 224. It is then ascertained in a step 228 whether any of the nodes defined within the virtual environment has undergone a position change since the last image frame was calculated. If not, then the same image frame is displayed in step 224. If there has been a position change by at least one node in the virtual environment, then the changed position values are obtained from processor 82 in a step 232. It is then ascertained in a step 234 whether the virtual environment has been modified (e.g., by changing the data network shown in FIG. 2). If so, then the virtual object nodes are redefined in a step 236. The system again waits for a synchronization signal in step 218 to prevent data overrun (since the position and orientation values usually are constantly changing), and to ensure that the views presented to each eye represent the same information. The new image frames for each eye are then calculated in a step 220, and the updated image frames are displayed to the participants in a step 224. In an alternate embodiment, after the "No" branch of step 228, or after either of steps 234 and 236, control is passed to a separate condition-testing step to determine if a user's viewpoint has changed. If not, control returns to either step 220 or step 218 as in the first embodiment. However, if a user's viewpoint has changed, the new viewpoint is determined and control is then passed to step 218.

While the above is a complete description of a preferred embodiment of the present invention, various modifications and uses may be employed. For example, the entire person need not be simulated in the virtual environment. For the example shown in FIG. 1, the virtual environment may depict only the head and hands of the virtual participant. Users can communicate at a distance using the shared environment as a means of communications. Any number of users may participate. Communications may take the form of speech or other auditory feedback including sound effects and music; gestural communication including various codified or impromptu sign languages; formal graphic communications, including charts, graphs and their three-dimensional equivalents; or manipulation of the virtual environment itself. For example, a window location in the virtual reality could be moved to communicate an architectural idea. Alternatively, a virtual tool could be used to alter a virtual object, such as a virtual chisel being used to chip away at a stone block or create a virtual sculpture.

A virtual reality network allows the pooling of resources for creation and improvement of the virtual reality. Data may be shared, such as a shared anatomical data base accessible by medical professionals and students at various locations. Researchers at different centers then could contribute then different anatomical data to the model, and various sites could contribute physical resources to the model (e.g., audio resources, etc.).

Participants in the expressive arts may use the virtual reality network to practice theatrical or other performing arts. The virtual reality network may provide interactive group virtual game environments to support team and competitive games as well as role playing games. A virtual classroom may be established so that remotely located students could experience a network training environment.

The virtual reality network also may be used for real time animation, or to eliminate the effects of disabilities by the participants. Participants with varying abilities may interact, work, play and create using individualized input and sensory display devices which give them equal abilities in the virtual environment.

Stereophonic, three-dimensional sounds may be presented to the user using first and second audio displays to produce the experience that the source of the sound is located in a specific location in the environment (e.g., from the mouth of a virtual participant), and three-dimensional images may be presented to the participants.

Linking technology for remotely located participants include Ethernet, phoneline, broadband (ISDN), and satellite broadcast, among others. Data compression algorithms may be used for achieving communications over low bandwidth media. If broadband systems are used, a central processor may process all image data and send the actual image frames to each participant. Prerecorded or simulated behavior may be superimposed on the model together with the real time behavior. The input data also may come from stored data bases or be alogorithimically derived. For example, a virtual environment could be created with various laws of physics such as gravitational and inertial forces so that virtual objects move faster or slower or deform in response to a stimulus. Such a virtual environment could be used to teach a participant how to juggle, for example.

Other user input devices may include eye tracking input devices, camera-based or others input devices for sensing the position and orientation of the real world participants without using clothing-based sensors, force feedback devices as disclosed in U.S. patent application Ser. No. 315,252 entitled "Tactile Feedback Mechanism For A Data Processing System" filed on Feb. 21, 1989 and incorporated herein by reference, ultrasonic tracking devices, infrared tracking devices, magnetic tracking devices, voice recognition devices, video tracking devices, keyboards and other conventional data entry devices, pneumatic (sip and puff) input devices, facial expression sensors (conductive ink, strain gauges, fiber optic sensors, etc.), and specific telemetry related to the specific environment being simulated, i.e., temperature, heart rate, blood pressure, radiation, etc. Consequently, the scope of the invention should not be limited except as described in the claims.

Swivel 1.5.50

5/30/90

Source Listing

© 1990 VPL Research, Inc.

APPENDIX 1

```
directory
'12/9/89 Swivel:5/30/90 Swivel Beta:Swivel 1.5.50:Swiv.utils.8:'
files -t TEXT
'(SHADE.8)'
'(ZBUFF)'
3.CURSORS
'68020 fix.math'
ASSEMBLER.UTILS
averagenormals
BACKPORTINIT.8
Buffer.Poly
'BYTE Z.CONSTANTS'
CheckEnvirons
CLEAR.BUFFERS
CodeSegUtils
'COLOR PICKER'
COLOR.MANAGE
COLOR.POLY
Color.POLY.PROCS.SEG
Default.Extensions
display.seg
DISPLAYSEGSCRIPT
DOTS
DOTS.8
ERROR.ALERT
GLUE.POLY.PROC
HEAP.UTILS
Init.Color.Poly
INIT.POLY.TRAPS
NEW.3LIST
OBJECT.DEFINITIONS
OBJECT.PLUCK
OBJECT.UTILITIES
PARTIAL.SHADE.8
POLY.CREATES.8
POLY.DRAW
POLY.DRAW.MAP
POLY.DRAW.MAP1
POLY.MACROS
POLY.NORMAL.CLIP.6820
POLY.NORMAL.CLIP.68201
PolyHeader
PolyRenderBlock
PORTINITS
QDTRAPS
RESOURCE.RECORDS
SMOOTHMAP
SMOOTHMAP.1
SOLID.DRAW
SOLID.SCRIPT.8
SYSTEM.GLOBALS
TRANS.68020
utils.script
WINDOW.ARRAY
'WORD Z.CONSTANTS'
WRITE.COS.TABLE
write.sphere.tabs
write.sphere.tabs.1
WRITE.THETA.TAB
```

```
\ Shading Utilities
\ updated 8.8.87 by Young Harvill
\ normalize, dot.product and shading changed to scale by
\ a full word. Compatible with new polygon algorithm

CR
." Loading shading utils... "

ANEW SHADES


\ TWO.VECTOR
\ Last Revision: 03/10/88  03:45:51 PM   YH
\ this version does the following:
\ while the count of points is greater than 3
\ find the smallest line segment in the poly and average those two points
\ compress the record and decremnt count of points


 PROC.START

 CODE CHECK.NIL,  assembler
   >R,
   SP ()   LONG TST, EQ IF,
   2 SP@,  LONG TST, EQ IF,
   2DROP,  0 LIT, COS.SCALER LIT,
   THEN, THEN,
   R>,
   RTS, END-CODE

 PROC.END

\ DOT.PRODUCT
\ finds the simple angular diffence between two.vectors

hex

  PROC.START

  CODE DOT.PRODUCT, ASSEMBLER    \ X Y Z 'X 'Y 'Z -- N DOT PRODUCT SCALED BY 10000 HEX
    >R,
  D0 POP, D0 1 LONG SUBQ,
  D0 2 # LONG ASR,      \ DIVIDE ALL REGS BY TWO FOR
  D1 POP, D1 1 LONG SUBQ,
  D1 2 # LONG ASR,      \ USING SIGNED WORD MULTIPLICATION
  D2 POP, D2 1 LONG SUBQ,
  D2 2 # LONG ASR,
    D3 POP, D3 1 LONG SUBQ,
  D3 2 # LONG ASR,
  D4 POP, D4 1 LONG SUBQ,
  D4 2 # LONG ASR,
  D5 POP, D5 1 LONG SUBQ,
  D5 2 # LONG ASR,
    D3 D0 MULS,         \ ' X * X
  D4 D1 MULS,         \ ' Y * Y
  D5 D2 MULS,         \ ' Z * Z
  D2 D1 LONG ADD,       \  NX + NY
    D1 D0 LONG ADD,       \ D0 = NY + NX + NZ
  D0 2 # LONG ASL,    .  \ SCALE BACK TO 3FFF
  D0 SWAP,          \ LOW WORD IS NEW TERM
  D0 LONG EXT,        \ EXTEND
  D0 2 # LONG ASL,       \ SCALE BACK TO FFFF
  D0 PUSH,          \ RETURN ON STACK
    R>,
```

```
   RTS, END-CODE
PROC.END

decimal


( shader )                                         ( 011038 YH )

PROC.START

CODE GET.COLOR.INDEX,   ASSEMBLER         \ nshade -- index for pixmap
  >R,
  0 +COLORINDEX A0 PBMOVE,             \ fetch the index of the object
  A0 () D0 LONG MOVE,
  0 +KEYCOLORRES A0 PBMOVE,
  A0 () D1 LONG MOVE,
  D1 D0 MULS,                   \ d0 is index255
  SP () D0 LONG ADD,                \ d0 is reflectance255
  D0 0 LONG CMPI, MI IF,             \ clip to 1
  0 D0 MOVEQ,
  THEN,
  D0 254 LONG CMPI, PL IF,           \ clip to 254
     254 # D0 LONG MOVE,
  THEN,
  D0 PUT,
   R>,
   RTS, END-CODE

PROC.END


PROC.START

CODE SCALE.WITHIN              \ DEPTH NUMBER -- SCALES NUMBER ON STACK WITHIN DEPTH
  >R,
  SAVE.REGS
   D0 POP,               \ D0 = depth of stack
   D1 POP,               \ d1 = maximum value
   0 D2 MOVEQ,             \ d2 is greatest value
   D1 1 LONG SUBQ,           \ test for zero count
   PL IF,                \ if plus
    D1 D4 LONG MOVE,          \ d4 is first loop
    BEGIN,               \ start first loop
      D3 POP,            \ fetch the number
      D3 RPUSH,            \ save on return stack
      D3 ABS,            \ take absolute value
      D3 D2 LONG CMP, MI IF,      \ if greater than temp
        D3 D2 LONG MOVE,      \ save as temp
      THEN,
    D4 LOOP,             \ finish the loop
    0 D3 MOVEQ,
    BEGIN,               \ start scale test
      D2 D0 LONG CMP, MI IF,      \ if greater than limit
        D2 1 # LONG ASR,      \ scale
        D3 1 LONG ADDQ,       \ increment the count
      THEN,
    D2 D0 LONG CMP, PL UNTIL,       \ continue until in range
    BEGIN,               \ start scaling loop
      D2 RPOP,            \ pop the number
      D3 LONG TST, NE IF,        \ test the scale factor
        D2 D3 LONG ASR,       \ scale the number
```

```
      THEN,
      D2 PUSH,            \ push on stack
    D1 LOOP,              \ loop till done
  THEN,
  RESTORE.REGS
  R>,
  RTS, END-CODE
PROC.END

PROC.START

CODE NSQR
  >R,
  D0 POP, 15 # D4 WORD MOVE,
  0 D1 MOVEQ, 0 D2 MOVEQ,
  BEGIN,
      D0 1 # LONG ASL,
    D1 1 # LONG ROXL,
      D0 1 # LONG ASL,
    D1 1 # LONG ROXL,
      D2 1 # LONG ASL,
    D2 D3 LONG MOVE,
      D3 1 # LONG ASL,
    D1 D3 LONG CMP,
      MI IF, D2 1 LONG ADDQ,
      D3 1 LONG ADDQ,
          D3 D1 LONG SUB,
    THEN,
    D4 WLOOP,
    D2 LONG EXT,
   D2 PUSH,
    R>, RTS,
    END-CODE
 PROC.END


  PROC.START

 CODE NNORMAL2,     ( normalize 2vector to COS.SCALER )
     >R, D0 GET,
   2 SP@, D1 LONG MOVE,
   D0 D0 MULS,
   D1 D1 MULS,
   D1  D0 LONG ADD,
   D0 PUSH,
   ' NSQR 4 - BSR,
     D3 POP,
   D1 POP, D2 POP,
   D3 D1 FIX.DIV,             \ because cos is scaled to 10000 hex
   D3 D2 FIX.DIV,
   D2 PUSH, D1 PUSH,
   R>, RTS,
   END-CODE
  PROC.END


  \ new two vector routine

  PROC.START

  code TOVECI
    >R,
    0 +normalpoints a0 pbmove,
```

```
0 +tempnormalpoints a1 pbmove,           \ transfer normal points
0 +polypoints# a6 i) d7 long move,         \ to temp.normals
3 # d7 muls,
d7 1 long subq, pl if,
  begin,
    a0 )+ a1 )+ long move,           \ use tempnormals
  d7 loop,
then,
0 +polypoints a0 pbmove,
0 +tempshade  a1 pbmove,             \ transfer normal points
0 +polypoints# a6 i) d7 long move,         \ to temp.normals
3 # d7 muls,
d7 1 long subq, pl if,
  begin,
    a0 )+ a1 )+ long move,           \ use tempnormals
  d7 loop,
then,
0 +shadepoints a0 pbmove,
0 +tempnormalpoints a1 pbmove,           \ set working point arrays
0 +tempshade a2 pbmove,              \ set working point arrays
0 +polypoints# a6 i) d7 long move,         \ to temp.normals
d7 1 long subq, pl if.l,
  begin,
    d7 3 long cmpi, pl if,
      d7 d6 long move,
      0 d5 moveq,
      begin,
        d5 12 word a0 @i) d0 long move,
        d5  0 word a0 @i) d0 long add,
        d0 1 # long asr,
        d0 d5  0 word a0 @i) long move,

        d5 12 word a1 @i) d0 long move,
        d5  0 word a1 @i) d0 long add,
        d0 1 # long asr,
        d0 d5  0 word a1 @i) long move,

        d5 12 word a2 @i) d0 long move,
        d5  0 word a2 @i) d0 long add,
        d0 1 # long asr,
        d0 d5  0 word a2 @i) long move,

        d5 16 word a0 @i) d0 long move,
        d5  4 word a0 @i) d0 long add,
        d0 1 # long asr,
        d0 d5  4 word a0 @i) long move,

        d5 16 word a1 @i) d0 long move,
        d5  4 word a1 @i) d0 long add,
        d0 1 # long asr,
        d0 d5  4 word a1 @i) long move,

        d5 16 word a2 @i) d0 long move,
        d5  4 word a2 @i) d0 long add,
        d0 1 # long asr,
        d0 d5  4 word a2 @i) long move,

        d5 20 word a0 @i) d0 long move,
        d5  8 word a0 @i) d0 long add,
        d0 1 # long asr,
        d0 d5  8 word a0 @i) long move,

        d5 20 word a2 @i) d0 long move,
        d5  8 word a2 @i) d0 long add,
```

```
        d0 1 # long asr,
        d0 d5  8 word a2 @i) long move,

        d5 12 long addi,
      d6 loop,
    then,
  d7 loop,
then,

  a2 () d0 long move,             \ translate to first temp point
  d0 12 a2 i) long sub,             \ do the first z
  d0 24 a2 i) long sub,             \ do the second z

  a2 4 long addq,

  a2 () d0 long move,             \ translate to first temp point
  d0 12 a2 i) long sub,             \ do the first y
  d0 24 a2 i) long sub,             \ do the second y

  a2 4 long addq,

  a2 () d0 long move,             \ translate to first temp point
  d0 12 a2 i) long sub,             \ do the first x
  d0 24 a2 i) long sub,             \ do the second x


  a0 () d0 long move,             \ translate to first shade point
  d0 12 a0 i) long sub,             \ do the first z
  d0 24 a0 i) long sub,             \ do the second z

  a0 4 long addq,

  a0 () d0 long move,             \ translate to first shade point
  d0 12 a0 i) long sub,             \ do the first y
  d0 24 a0 i) long sub,             \ do the second y

  a0 4 long addq,

  a0 () d0 long move,             \ translate to first shade point
  d0 12 a0 i) long sub,             \ do the first x
  d0 24 a0 i) long sub,             \ do the second x

  a1 () d0 long move,             \ translate to first normal point
  d0 12 a1 i) long sub,             \ translate the first x
  d0 24 a1 i) long sub,             \ translate the second x

  a1 4 long addq,

  a1 () d0 long move,             \ translate to first normal point
  d0 12 a1 i) long sub,             \ translate the first y
  d0 24 a1 i) long sub,             \ translate the second y


  12 +shadepoints a0 pbmove,            \ restore var
                          \ now push the vector
  20 a0 I) push,
  16 a0 i) push,
  12 a0 i) push,

  8 a0 I) push,
  4 a0 i) push,
  a0 ()   push,
```

```
    6 LIT,
    4096 LIT,
    ' SCALE.WITHIN 4- BSR,
  R>, rts,  end-code

  PROC.END


PROC.START

CODE TOVECII
  >R,

    0 +POLYPOINTS# A0 PBMOVE,
    A0 () D7 LONG MOVE,
    0 +SHADEPOINTS A0 PBMOVE,
    A0 A1 LONG MOVE,            \ a1 = shade.points
    D7 D6 LONG MOVE,            \ d6 is count
    D6 2 LONG SUBQ,             \ start at second point
    8 A1 I) D0 LONG MOVE,            \ d0 = first x point
    12 D3 MOVEQ,
    0 D1 MOVEQ,               \ offset to second point
    BEGIN,                  \ search for minimum x point
      D3 8 WORD A1 @I) D2 LONG MOVE,     \ d2 is new x
      D2 D0 LONG CMP, PL IF,        \ compare with old, if smaller
        D2 D0 LONG MOVE,        \ set the new point as the test
        D3 D1 LONG MOVE,        \ save the offset
      THEN,                 \ d0 is x value, d1 is offset to largest x point
      D3 12 LONG ADDI,          \ increment the offset for the next point
    D6 LOOP,
    D1 D3 LONG MOVE,            \ d3 is offset to min x point
    D3 PUSH,                \ push the first point's offset
    D3 8 WORD A1 @I) D2 LONG MOVE,      \ move the min point to d0 - d2
    D3 4 WORD A1 @I) D1 LONG MOVE,
    D3 0 WORD A1 @I) D0 LONG MOVE,
    A0 A1 LONG MOVE,            \ a1 is shade.points
    D7 D6 LONG MOVE,            \ d6 is current count
    D6 1 LONG SUBQ,             \ for loop till negative
    BEGIN,
      D0 A1 () LONG SUB,          \ subtract min x from everthing
      D1 4 A1 I) LONG SUB,
      D2 8 A1 I) LONG SUB,
      12 # A1 LONG ADDA,          \ increment the address
    D6 LOOP,                \ now points are center on minimum x point
    0 +SHADEPOINTS A1 PBMOVE,
    0 +TEMPSHADE A0 PBMOVE,
    A0 A2 LONG MOVE,                \ a2 = temp.shade
    D7 D6 LONG MOVE,              \ d6 is current count
    D6 1 LONG SUBQ,               \ for negative loop
    BEGIN,                  \ write shade points to temp shade
      A1 )+ A2 )+ LONG MOVE,          \ write the three-point
      A1 )+ A2 )+ LONG MOVE,
      A1 )+ A2 )+ LONG MOVE,
    D6 LOOP,
    A0 A1 LONG MOVE,            \ a1 is temp.shade
    D7 D6 LONG MOVE,            \ d6 is current count
    D6 2 LONG SUBQ,             \ for testing second point through end
    8 A1 I) D0 LONG MOVE,            \ d0 is test for max x
    12 D3 MOVEQ,
    0 D1 MOVEQ,               \ set offset to second point
      BEGIN,
      D3 8 WORD A1 @I) D2 LONG MOVE,     \ d2 is the new x
      D2 D0 LONG CMP, MI IF,        \ compare with the max value, if greater
        D2 D0 LONG MOVE,        \ d0 is new greater value
```

```
    D3 D1 LONG MOVE,          \ d1 is offset to new
   THEN,                     \ d0 is x value, d1 is offset to largest x point
   D3 12 LONG ADDI,
  D6 LOOP,
  D1 D3 LONG MOVE,            \ d3 is offset to min x point
  D3 PUSH,                   \ save offset to first point on stack
  D3 8 WORD  A1 @I) PUSH,        \ push x first
  D3 4 WORD  A1 @I) PUSH,        \ then y
   2 LIT,
  4096 LIT,
  ' SCALE.WITHIN 4- BSR,
  save.regs
  ' NNORMAL2, 4- BSR,             \ normalize to cos.scale
    restore.regs
  ' CHECK.NIL, 4- BSR,             \ check for nil
  TEMP.SIN POP,                  \ temp.sin is d6
  TEMP.COS POP,                    \ temp.cos is d5
    TEMP.SIN LONG NEG,               \ negative cosine for unrotate
      A0 A1 LONG MOVE,             \ a1 is shade.temp
  D7 D4 LONG MOVE,             \ d4 is loop
  D4 1 LONG SUBQ,              \ loop ends at -1
  BEGIN,                     \ transform the temp.shade points
    8 A1 I) PUSH,              \ push x
    4 A1 I) PUSH,              \ push y
    SAVE.REGS               \ save the regs
    ROTAT                   \ rotat the points
    RESTORE.REGS              \ restore the regs
    4 A1 I) POP,              \ fetch y
    8 A1 I) POP,              \ fetch x
    12 # A1 LONG ADDA,            \ increment the address
  D4 LOOP,                  \ loop till done
  D7 D6 LONG MOVE,             \ d6 = current count
  D6 2 LONG SUBQ,              \ for loop till negative
  A0 A1 LONG MOVE,             \ a1 = temp.shade
  4  A1 I) D0 LONG MOVE,            \ d0 is test max y
  12 D3  MOVEQ,
  0 D1  MOVEQ,
  D0 ABS,
    BEGIN,
    D3 4 WORD A1 @I) D2 LONG MOVE,
    D2 ABS,
    D2 D0 LONG CMP, MI IF,
      D2 D0 LONG MOVE,
      D3 D1 LONG MOVE,
    THEN,
    D3 12 LONG ADDI,          \ d0 is x value, d1 is offset to largest x point
   D6 LOOP,
   D1 D3 LONG MOVE,
   D4 POP,
   D5 POP,                  \ D5 is offset for first point
   D3 D4 LONG CMP,
   PL IF,
     D3 D4 EXG,               \ exchange if out of order
   THEN,                    \ now check for first point in center
   0 D0 MOVEQ,                \ d0 is swap point
   D4 D5 LONG CMP,
   MI IF,                   \ if d4 is larger
     D0 1 LONG EORI,              \ xor the flag
   THEN,
   D3 D5 LONG CMP,
   MI IF,                   \ if d3 is larger too..
     D0 1 LONG EORI,              \ xor the flag
   THEN,
   D0 LONG TST, NE IF,            \ if first point is in the center..
```

```
     D3 D4 EXG,              \ do the swap...
   THEN,
   0 +SHADEPOINTS A0 PBMOVE,        \ a0 = shade.points
   D3 8 WORD  A0 @I) PUSH,         \ push the first point
   D3 4 WORD  A0 @I) PUSH,
   D3 0 WORD  A0 @I) PUSH,
   D4 8 WORD  A0 @I) PUSH,         \ push the second point
   D4 4 WORD  A0 @I) PUSH,
   D4 0 WORD  A0 @I) PUSH,
  6 LIT,
  4096 LIT,
  ' SCALE.WITHIN 4- BSR,           \ scale to fit
 R>,
 RTS,  END-CODE
PROC.END                     \ done


\  CROSS.PRODUCT
\  cross product finds the vector normal to the plane described by
\  two vectors.


 PROC.START

CODE (TWO.VECTOR)
  >R,
  0 +POLYPOINTS# A6 I) D0 LONG MOVE,
  D0 5 LONG CMPI, MI IF,
    ' TOVECI 4- BSR,
  ELSE,
    ' TOVECII 4- BSR,
  THEN,
  R>, RTS, END-CODE
PROC.END



  PROC.START

CODE (CROSS.PRODUCT)
   >R,               \ QX QY QZ PX PY PZ -- CX CY CZ
   02 SP@, D0 LONG MOVE,
       14 SP I) D0 MULS,        \ D0 = PyQz
   SP ()    D1 LONG MOVE,
       18 SP I) D1 MULS,        \ D1 = PzQy
     D1 D0 LONG SUB,          \ D0 = PyQz - PzQy
   SP ()    D1 LONG MOVE,
       22 SP I) D1 MULS,        \ D1 = PzQx
   03 SP@, D2 LONG MOVE,
       14 SP I) D2 MULS,        \ D2 = PxQz
     D2 D1 LONG SUB,          \ D1 = PzQx - PxQz
   03 SP@, D2 LONG MOVE,
       18 SP I) D2 MULS,        \ D2 =  PxQy
   02 SP@, D3 LONG MOVE,
       22 SP I) D3 MULS,        \ D3 =  PyQx
      D3 D2 LONG SUB,          \ D2 =  PxQy - PyQx
        SP 08 LONG ADDQ,
        SP 08 LONG ADDQ,
        SP 08 LONG ADDQ,        \ empty the stack
  D0 PUSH,  D1 PUSH, D2 PUSH,      \ push results
  R>, RTS, END-CODE
 PROC.END

  PROC.START
```

```
CODE (ZCross.Product)        \ QX QY QZ PX PY PZ
 >R,
   03 SP@, D2 LONG MOVE,
   18 SP I) D2 MULS,        \ PxQy
   02 SP@, D3 LONG MOVE,
 22 SP I) D3 MULS,        \ PyQx
      D3  D2 LONG SUB,
     SP 08 LONG ADDQ,
   SP 08 LONG ADDQ,
   SP 08 LONG ADDQ,
      D2 PUSH,
 R>,
RTS, END-CODE
PROC.END

\ NORMALIZE
\ takes the three-space vector x y z and scales it so that the length of
\ the vector is constant. Scales to hex 10000


\ NORMALIZE UTIL , IF.SCALE, OVER.CHECK



( NORMALIZE UTIL, XYZ.2,  D0/SP )                    ( 102785 YH )


PROC.START

CODE XYZ.2  ASSEMBLER     ( SQUARES X Y Z AND ADDS THEM / X Y Z N )
  >R,
    D0 GET, 02 SP I) D0 MULS,          ( Z2 )
    02 SP@,  D1 LONG MOVE,
    06 SP I) D1 MULS,                  ( Y2)
    D1  D0 LONG ADD,                 ( D0 = Y2 + Z2 )
    03 SP@,  D1 LONG MOVE,
    10 SP I) D1 MULS,                  ( X2 )
    D1  D0 LONG ADD, D0 PUSH,        (  D0 = Y2 + Z2 + X2 , )
  R>,
RTS, END-CODE

PROC.END


( NORMALIZE UTIL, XYZ./SP )                          ( 102785 YH )


PROC.START

CODE  XYZ/SP  ASSEMBLER       \ SCALES AND DIVIDES XYZ BY TOP OF STACK
  >R,
    D2 GET,
    02 SP@, D1 LONG MOVE,     \  fix.div uses d0 as scratch
      D2 D1 FIX.DIV,
    D1 02 SP@, LONG MOVE,
    03 SP@, D1 LONG MOVE,
      D2 D1 FIX.DIV,
    D1 03 SP@, LONG MOVE,
    04 SP@, D1 LONG MOVE,
      D2 D1 FIX.DIV,
    D1 04 SP@, LONG MOVE,
  R>, RTS, END-CODE
PROC.END
```

```
                                        ( 011038 YH )
( NORMALIZE / NORMALIZES VECTORS )      ( 011038 YH )

PROC.START

CODE (NORMALIZE,)
       >R,
       3 LIT,
     4096 LIT,
  ' SCALE.WITHIN 4- BSR,
     ' XYZ.2 4- BSR,              \ SQR AND ADD XYZ, / X Y Z N
     ' nsqr 4- BSR,
     SP () LONG TST,  GT IF,       \ DIV BY 0 ?
       ' XYZ/SP 4 - BSR, ELSE,
       1 D1 MOVEQ,                 \ SCALE BY -HYP
       D1 02 SP@, LONG MOVE,       \ IF ZERO DIV
       D1 03 SP@, LONG MOVE,       \ PUSH ZEROS
       D1 04 SP@, LONG MOVE,
      THEN,  DROP,
    R>,
    RTS, END-CODE
PROC.END    ( RETURNS VECTORS SCALED BY 10000 hex -- X Y Z  )
```

```
\ SET PLANE DIFF

\ sets the zslope relative to x and y from the normal vector
\ zscaling routines are used to scale the z value for the zbuffer
```

```
 PROC.START

CODE (SET.PLANE.DIF)
  >R,
  D1 POP, D2 POP, D3 POP,
  D1 LONG TST, MI IF,     \ use positive z value
   D1 LONG NEG,
   D2 LONG NEG,
   D3 LONG NEG,
  THEN,
  0 +ZBUFFSCALE A6 I) D4 LONG MOVE,
  D4 02 LONG ADDQ,
  D2 D4  LONG ASR,
  D3 D4  LONG ASR,
  D1 2 # LONG ASR,
  D1 D0 LONG MOVE,
  D1 D2 FIX.DIV,
  D1 D3 FIX.DIV,
  D2 LONG NEG,
  D3 LONG NEG,
  D3  0 +ZXDIFF A6 I) LONG MOVE,
  D2  0 +ZYDIFF A6 I) LONG MOVE,
  R>, rts,  END-CODE
```

```
PROC.END


PROC.START
CODE (MAP.SHADE)
  >R,
    DROP, D2 POP, D1 POP,
    9 D4 MOVEQ,
    4 D3 MOVEQ,
    D2 D0 LONG MOVE,
    D0 D3 LONG ASR,
    D0 D2 LONG SUB,
    D2 D4 LONG ASR,
    D2 LONG NEG,
    D1 D0 LONG MOVE,
    D0 D3 LONG ASR,
    D0 D1 LONG SUB,
    D1 D4 LONG ASR,
    D1 LONG NEG,
    D2 8 # LONG ASL,
    D1 D2 LONG ADD,
    0 +MAPBUFF A6 I) A0 LONG MOVE,
    0 D0 MOVEQ,
    D2 0 WORD A0 @I) D0 BYTE MOVE,
    D0 0 +PAT# A6 I) LONG MOVE,          \ d2 is color index
  R>,
RTS, END-CODE
PROC.END
```

6/1/90 20:47 (ZBUFF) Page 1

```
cr ." loading zbuffer routines... "
anew zbuff.routs


\ routines and macros to read the zbuffer and obuffer
\ all calls to the zbuffer should use these macros and routines
\ Last Revision: 08/09/87  11:26:25 AM   YH
\ Last Revision: 04/17/88  01:42:55 PM   YH
\ low level clipping to scan.index address


: (ZBUFF)   ASSEMBLER              \ d5 = y  d6 = x  -- a0 = address
 SCAN.INDEX A0 )#MOVE,          \ a0 is scan.index
 D5 D0 LONG MOVE,             \ d0 is tempy
 D0 SCAN.RECORD# 1- LONG ANDI,        \ low level cliping
 D0 2 # LONG ASL,             \ tempy * 2 for index to scan.index
 D0 0 WORD A0 @I) D1 LONG MOVE,      \ d1 is index for scan.array
 ^SCAN.ARRAY A0 )#MOVE,         \ fetch pointer to scan.array
 A0 () A0 LONG MOVE,           \ d0 is scan.array
 D1 Z.ADDRESS LONG A0 @I) D0 LONG MOVE,  \ D0 is address of current z scan
 D6 D1 LONG MOVE,             \ d1 is tempx
 D1 Z.SHIFT # LONG ASL,           \ tempx * 2 for length of zbuffer record
 D1 D0 LONG ADD,              \ add x poffset to zbuffer
 D0 A0 LONG MOVE,  ;            \ store in a0 for output


: (OBUFF)   ASSEMBLER              \  d5 = y  d6 = x  -- a0 = address
 (ZBUFF)                \  find address for zbuffer
 Z.RECORD 2/ # A0 LONG ADDA,   ;      \ add half record for obuffer


CODE ZBUFF@                    \ x,y -- zbuffer value
     SAVE.REGS                 \ save regs
     D5 POP, D6 POP,             \ fetch x and y from stack
     (ZBUFF)                   \ fetch address for zbuffer
     A0 () D0 Z.SIZE, MOVE,           \ fetch the zbuffer value
     D0 Z.EXT,
     D0 PUSH,                  \ push on stack
     RESTORE.REGS                \ restore regs
     NEXT END-CODE               \ end


CODE OBUFF@                    \ x,y -- zbuffer value
     SAVE.REGS                 \ save regs
     D5 POP, D6 POP,             \ fetch x and y from stack
     (OBUFF)                   \ fetch address for Obuffer
     A0 () D0 Z.SIZE, MOVE,           \ fetch the zbuffer value
     D0 Z.EXT,                 \ extend to long
     D0 PUSH,                  \ push on stack
     RESTORE.REGS                \ restore regs
     NEXT END-CODE               \ end


: ZBUFFERX>D7,  ASSEMBLER
 ZBUFFERX A0 )#MOVE,
 A0 () D7 LONG MOVE, ;


: SET.XY>ZBUFF,  ASSEMBLER          \ d5 = y  d6 = x  -- a0 = address
 SCAN.INDEX A0 )#MOVE,         \ a0 is scan.index
```

```
 D5 D0 LONG MOVE,             \ d0 is tempy
 D0 SCAN.RECORD# 1- LONG ANDI,       \ low level clipping
 D0 2 # LONG ASL,             \ tempy * 2 for index to scan.index
 D0 0 WORD A0 @I) D1 LONG MOVE,      \ d1 is index for scan.array
 ^SCAN.ARRAY A0 )#MOVE,         \ fetch pointer to scan.array
 A0 () D0 LONG MOVE,            \ d0 is scan.array
 D0 A0 LONG MOVE,             \ a0 is scan.array
 D1 Z.ADDRESS LONG A0 @I) D0 LONG MOVE,  \ D0 is address of current z scan
 D6 D1 LONG MOVE,             \ d1 is tempx
 D1 Z.SHIFT # LONG ASL,           \ tempx * 2 for length of zbuffer record
 D1 D0 LONG ADD,              \ add x offset to zbuffer
 THE.BUFFER A0 )#MOVE,            \ fetch pointer to current buffer
 A0 () D1 LONG MOVE,            \ d1 = value of current buffer
 D1 Z.SHIFT LONG ANDI,            \ mask low bit
 D1 D0 LONG ADD,              \ add bit value to zbuffer
 D0 A0 LONG MOVE,             \ a0 = current buffer
 ;


CODE THE.BUFF@        ( X,Y -- ZBUFFER VALUE )
     SAVE.REGS
     D5 POP, D6 POP,
     SET.XY>ZBUFF,
     0 D0 MOVEQ,
     A0 () D0 Z.SIZE, MOVE,
     D0 Z.EXT,
     D0 PUSH,
     RESTORE.REGS
     NEXT END-CODE

CODE THE.BUFF         ( X,Y -- ZBUFFER ADDRESS )
     SAVE.REGS
     D5 POP, D6 POP,
     SET.XY>ZBUFF,
     A0 PUSH,
     RESTORE.REGS
     NEXT END-CODE


 ( D6=XLOOP, D5=YLOOP , D4= LAST.EDGE , D3 = THIS.EDGE )
 (  A0 IS ZBUFFER )


: SET.DOT  ASSEMBLER            \ d5 = y  d6 = x  -- a0 = address
   ^SCAN.ARRAY  A1 )#MOVE,          \ a2 is scan array
 A1 () A2 LONG MOVE,
 SCAN.INDEX  A1 )#MOVE,          \ a1 is scan index
   D5 D0 LONG MOVE,
 D6 D1 LONG MOVE,
 D0 SCAN.RECORD# 1- LONG ANDI,           \ low level clipping
 D0 2 # WORD ASL,             \ y * 2
 D0 0 WORD A1 @I) D3 LONG MOVE,      \ D3 = Y index to array
 D6 D1 LONG MOVE,             \ d0 is tempx
 D1 2 # LONG ASL,             \ d0 is x byte
 D1 0 WORD A1 @I) D0 LONG MOVE,      \ d0 = x index to array
   D3 0 LONG A2 @I) A1 LONG MOVE,     \ a1 = start yscan address
 D0 X.BYTE LONG A2 @I) A1 WORD ADDA,   \ a1 = final yscan address
 D0 X.BIT  LONG A2 @I) D2 WORD MOVE,   \ d2 is xbit
   ;
```

```
( D6=XLOOP, D5=YLOOP , D4= LAST.EDGE , D3 = THIS.EDGE )

                                        ( 102386 YH )

: DEC.Y.DOT  ASSEMBLER
  D7 D0 LONG MOVE,
  D0 3 # LONG ASR,
  D0 LONG NEG,
  D0 A1 LONG ADDA, ;

: DEC.Y.DOT.8  ASSEMBLER
  D7 D0 LONG MOVE,
  D0 LONG NEG,
  D0 A1 LONG ADDA, ;


: DEC.X.DOT ASSEMBLER
  D2 7 LONG CMPI, EQ IF,
  -1 # A1 LONG ADDA,
   -1 D2 MOVEQ, THEN,
  D2 1 LONG ADDI, ;

 : DEC.X.DOT.8 ASSEMBLER
  -1 # A1 LONG ADDA, ;


: DEC.X.ZB ASSEMBLER
 Z.RECORD -1 * # A0 LONG ADDA, ;

: DEC.Y.ZB ASSEMBLER
 D7 D0 LONG MOVE,
 D0 Z.SHIFT # LONG ASL,
 D0 LONG NEG,
 D0 A0 LONG ADDA, ;


 CODE DEC.X  DEC.X.ZB  DEC.X.DOT  RTS, END-CODE
 CODE DEC.X.8  DEC.X.ZB  DEC.X.DOT.8  RTS, END-CODE


 CODE (SET.ZRECT)  ( x y 'x 'y LEVEL )
  SAVE.REGS
   D7 POP,
 D4 POP, D3 POP,             \ fetch lower right point
 D5 POP, D6 POP,             \ d5 is y d6 is x
  D6 D3 LONG SUB,              \ d3 is x diff
  D5 D4 LONG SUB,              \ d4 is y diff
  (ZBUFF)                   \ fetch zbuff address
  Z.REC.SHIFT D0 MOVEQ,
  D7 D0 LONG ASL,               \ shift zbuffer value to high byte
  0 # D7 Z.SIZE, MOVE,            \ load d7 with 0 for world value
  ZBUFFERX A1 )#MOVE,
  A1 () D2 LONG MOVE,             \ d2 = row.bytes of current.poly
  D2 Z.SHIFT # LONG ASL,            \ scale * Z.RECORD for one zbuffer line
   BEGIN,                   \ start y loop
       A0 A1 LONG MOVE,          \ a1 is temp screen scanline
       D3 D0 LONG MOVE,          \ d0 is temp x loop
       BEGIN,               \ start xloop
          D7 A1 )+ 2Z.SIZE, MOVE,       \ store value
       D0 LOOP,             \ loop for x
       D2 A0 LONG ADDA,           \ add increment for new scanline
   D4 LOOP,                  \ loop for y
  RESTORE.REGS                \ restore regs
  NEXT END-CODE
```

```
\ NEW CURSOR UTILITIES
\  these routines reimplement some of the time
\  critical forth code from the solid.draw utility


ANEW  3.CURSORS

 cr
  ." Loading 3.cursor utils..."


( XYLIMIT : LIMITS TO WINDOW , DRAW.LINES, useless I think

 CODE XYLIMIT  SET.WINYS
   D0 GET, D0 LONG EXT, Y.LIMIT D0 PUT,
   02 SP@, D0 LONG MOVE, D0 WORD EXT,
        X.LIMIT D0 02 SP@, LONG MOVE,
   03 SP@, D0 LONG MOVE, D0 WORD EXT,
        Y.LIMIT D0 03 SP@, LONG MOVE,
   04 SP@, D0 LONG MOVE, D0 WORD EXT,
        X.LIMIT D0 04 SP@, LONG MOVE,
   NEXT END-CODE  )



   \ clipper - X Y 'X 'Y / clips to window


  : SET.CWINYS  ASSEMBLER  ( WINDOW LIMITS TO DATA REGISTERS )
    WINYMIN OLIT, A0 POPOFF,  A0 () D2 LONG MOVE,
    WINYMAX OLIT, A0 POPOFF,  A0 () D3 LONG MOVE,
    WINXMIN OLIT, A0 POPOFF,  A0 () D4 LONG MOVE,
    WINXMAX OLIT, A0 POPOFF,  A0 () D5 LONG MOVE, ;


   : PUT1, ASSEMBLER
   MI IF,
     D6 01 LONG ADDQ,
   THEN, ;

   : OUTCODE  ASSEMBLER       \  d1= x , d0 = y  sets outcode in d6
    0 D6 MOVEQ,
     D4 D1 LONG CMP,
     PUT1, D6 01 # LONG ROL,  \  x - xmin
     D1 D5 LONG CMP,
     PUT1, D6 01 # LONG ROL,  \  xmax - x
     D2 D0 LONG CMP,
     PUT1, D6 01 # LONG ROL,  \  y - ymin
     D0 D3 LONG CMP,
     PUT1,  ;                 \  ymax - y


  ( clipper - X Y 'X 'Y / clips to window  )        ( 060186 yh )

    CODE SET.OUTCODES   >R,
        SET.CWINYS         \ bring window limits to regs
        03 SP@, D0 LONG MOVE,
        04 SP@, D1 LONG MOVE,   \ move first point into x and y
        OUTCODE        \ fetch outcode
        D6 PUSH,               \ x y 'x 'y  outcode
        02 SP@, D0 LONG MOVE,   \ move second point into x and y
        03 SP@, D1 LONG MOVE,
```

```
     OUTCODE         \ fetch outcode fro point
     D6 PUSH,      R>,       \ x y 'x 'y outcode 'outcode
  RTS,  END-CODE


( trivial.accept  trivial.reject )                ( 060186 yh )


CODE  TRIVIAL.ACCEPT           \  outc'outc | outc'outc flag
       >R,             \ save return on r stack
   0 D6 MOVEQ,           \ sets flag to -1 = accept
       SP () DO LONG MOVE,  \ d0 = 1st outcode
       2 SP@, DO LONG OR,  \ or first outcode with second
   EQ IF,
         -1 # D6 LONG MOVE,  \ set d6 to true
   THEN,
       D6 PUSH,           \ return flag on stack
   R>, RTS,  END-CODE     \ restore return address


CODE  TRIVIAL.REJECT           \  outc'outc | outc'outc flag
       >R,
   0 D6 MOVEQ,          \ sets flag to -1 = accept
       SP ()  DO LONG MOVE,  \ fetch first outcode
       2 SP@, DO LONG AND, \ compare to second outcode
   NE IF,
         -1 #  D6 LONG MOVE, \ if not equal then set flag
   THEN,
       D6 PUSH,          \ push flag on stack
   R>, RTS,  END-CODE


\  PNT1.IN?.SWAP

   CODE  PNT1.SWAP        \ x y 'x 'y outc1 outc2 -- if outc2 is true 'x 'y x y outc2 outc1
     >R,            \ save return address
       DO GET, EQ IF,
            DO POP, D1 POP,
      D2 POP, D3 POP,
      D4 POP, D5 POP,
            D3 PUSH, D2 PUSH,
      D5 PUSH, D4 PUSH,
      DO PUSH, D1 PUSH,
       THEN,
     R>, RTS,  END-CODE


   : 4EXT,  ASSEMBLER     \ extends top 4 stack longs
         DO POP, DO LONG EXT,
     D1 POP, D1 LONG EXT,
         D2 POP, D2 LONG EXT,
     D3 POP, D3 LONG EXT,
         D3 PUSH, D2 PUSH,
     D1 PUSH, DO PUSH, ;


  (  OUT1.SUBDIV )                                 ( 060186 YH )
  CODE  OUT1.SUBDIV   ( X2 Y2 'X1 'Y1 OUTC2 'OUTC1 ; )
         >R,  WINYMAX OLIT, A0 POPOFF,
         A0 () DO LONG MOVE,
         DO D3 LONG MOVE,                ( D0 = NY1          )
         03 SP@, D3 LONG SUB,        ( D3 = [YMAX - Y1 ] )
```

```
      06 SP@, D4 LONG MOVE,
      04 SP@, D4 LONG SUB,          ( D4 = [X2-X1]        )
      05 SP@, D2 LONG MOVE,
      03 SP@, D2 LONG SUB,          ( D2 = [Y2-Y1 ]       )
      D3 D4 MULS, D2 0 WORD CMPI, NE IF,
      D2 D4 DIVS, D4 LONG EXT, ELSE, 0 D4 MOVEQ, THEN,
      04 SP@, D4 LONG ADD,          ( D4 = NX1            )
     2DROP, 2DROP, D4 PUSH, D0 PUSH,  R>, RTS,
     END-CODE

( nx1= x1 + [x2-x1] * [ymax - y1 ] / [y2-y1 ]  ) ( ny1 = ymax )
(  out2.subdiv )                                 ( 060186 YH )


CODE  OUT2.SUBDIV   ( X2 Y2 'X1 'Y1 OUTC2 'OUTC1 | )
      >R, WINYMIN OLIT, A0 POPOFF,
      A0 () D0 LONG MOVE,
      D0 D3 LONG MOVE,              ( D0 = NY1            )
      03 SP@, D3 LONG SUB,   ( D3 = [YMIN - Y1 ] )
      06 SP@, D4 LONG MOVE,
      04 SP@, D4 LONG SUB,   ( D4 = [X2-X1]       )
      05 SP@, D2 LONG MOVE,
      03 SP@, D2 LONG SUB,   ( D2 = [Y2-Y1 ]      )
      D3 D4 MULS, D2 0  WORD CMPI, NE IF,
      D2 D4 DIVS, D4 LONG EXT, ELSE, 0 D4 MOVEQ, THEN,
      04 SP@, D4 LONG ADD,      ( D4 = NX1 )
     2DROP, 2DROP, D4 PUSH, D0 PUSH, R>, RTS, END-CODE

( nx1= x1 + [x2-x1] * [ymin - y1 ] / [y2-y1 ]  ) ( ny1 = ymin )
(  out3.subdiv )                                 ( 060186 YH )


CODE  OUT3.SUBDIV   ( X2 Y2 'X1 'Y1 OUTC2 'OUTC1 | )
      >R, WINXMAX OLIT, A0 POPOFF,
      A0 () D0 LONG MOVE,
      D0 D3 LONG MOVE,              ( D0 = NX1            )
      04 SP@, D3 LONG SUB,   ( D3 = [XMAX - X1 ] )
      05 SP@, D4 LONG MOVE,
      03 SP@, D4 LONG SUB,   ( D4 = [Y2-Y1]       )
      06 SP@, D2 LONG MOVE,
      04 SP@, D2 LONG SUB,   ( D2 = [X2-X1 ]      )
       D3 D4 MULS, D2 0  WORD CMPI, NE IF,
      D2 D4 DIVS, D4 LONG EXT, ELSE, 0 D4 MOVEQ, THEN,
      03 SP@, D4 LONG ADD,      ( D4 = NY1 )
     2DROP, 2DROP, D0 PUSH, D4 PUSH, R>, RTS, END-CODE

( ny1= y1 + [y2-y1] * [xmax - x1 ] / [x2-x1 ]  ) ( nx1 = xmax )
(  out4.subdiv )                                 ( 060186 YH )

CODE  OUT4.SUBDIV   ( X2 Y2 'X1 'Y1 OUTC2 'OUTC1 | )
      >R, WINXMIN OLIT, A0 POPOFF,
      A0 () D0 LONG MOVE,
      D0 D3 LONG MOVE,              ( D0 = NX1            )
      04 SP@, D3 LONG SUB,   ( D3 = [XMIN - X1 ] )
      05 SP@, D4 LONG MOVE,
      03 SP@, D4 LONG SUB,   ( D4 = [Y2-Y1]       )
      06 SP@, D2 LONG MOVE,
      04 SP@, D2 LONG SUB,   ( D2 = [X2-X1 ]      )
      D3 D4 MULS, D2 0 WORD CMPI, NE IF,
      D2 D4 DIVS, D4 LONG EXT, ELSE, 0 D4 MOVEQ, THEN,
      03 SP@, D4 LONG ADD,      ( D4 = NY1 )
     2DROP, 2DROP, D0 PUSH, D4 PUSH, R>, RTS, END-CODE

( ny1= y1 + [y2-y1] * [xmin - x1 ] / [x2-x1 ]  ) ( nx1 = xmin )
```

```
( SUBDIV )                                          ( 060186 YH )

  CODE  SUBDIV  >R,
         D0 GET, D0 01 LONG ANDI, NE IF,
         ' OUT1.SUBDIV 4- BSR, ELSE,
                 D0 GET, D0 02 LONG ANDI, NE IF,
                 ' OUT2.SUBDIV 4- BSR, ELSE,
                     D0 GET, D0 04 LONG ANDI, NE IF,
                     ' OUT3.SUBDIV 4- BSR, ELSE,
                            D0 GET, D0 08 LONG ANDI, NE IF,
                            ' OUT4.SUBDIV 4- BSR, THEN,
                      THEN,
                 THEN,
           THEN,  R>,
        RTS, END-CODE

( LINE.CLIP )                                       ( 011138 YH )

 CODE  LINE.CLIP     ( X2 Y2 'X1 'Y1 | X2 Y2 'X1 'Y1 CFLAG )
          SAVE.REGS 4EXT,
          BEGIN,  0 # RP -) LONG MOVE,
        ' SET.OUTCODES   4- BSR,
        ' TRIVIAL.REJECT 4- BSR,
          D0 POP, NE IF,  01 # RP () LONG MOVE,
                 2DROP,  ELSE,
               ' TRIVIAL.ACCEPT 4- BSR,
                 D0 POP, NE IF, -1 # RP () LONG MOVE,
                 2DROP,  ELSE,
                   ' PNT1.SWAP 4- BSR,
                   ' SUBDIV 4- BSR,
                 THEN,
        THEN,  RP )+ D0 LONG MOVE,  NE UNTIL, D0 01 LONG ADDQ,
        D0 PUSH, RESTORE.REGS  NEXT END-CODE


 CODE  LINE.OFFSET  SAVE.REGS
       STARTY OLIT, A0 POPOFF,
    A0 () D6 LONG MOVE,
    D6 1 LONG ADDQ,        \ for alignment
        STARTX OLIT, A0 POPOFF,
    A0 () D5 LONG MOVE,
        D0 POP, D1 POP, D2 POP, D3 POP,
        D6 D0 LONG ADD,
    D6 D2 LONG ADD,
        D5 D1 LONG ADD,
    D5 D3 LONG ADD,
        D3 PUSH, D2 PUSH, D1 PUSH, D0 PUSH,
       RESTORE.REGS   NEXT END-CODE


 \ SETUP LINER TOKENS

   : (LINER.1BIT
     LINE.OFFSET
       LINE.CLIP 0 = IF LINER.1BIT
       ELSE 2DROP 2DROP THEN ;

   : (LINER.2BIT
     LINE.OFFSET
       LINE.CLIP 0 = IF LINER.2BIT
       ELSE 2DROP 2DROP THEN ;
```

```
: (LINER.4BIT
  LINE.OFFSET
    LINE.CLIP 0 = IF LINER.4BIT
    ELSE 2DROP 2DROP THEN ;

: (LINER.8BIT
  LINE.OFFSET
    LINE.CLIP 0 = IF LINER.8BIT
    ELSE 2DROP 2DROP THEN ;

: LINER.BIT
  10 PENMODE
  >R v.tool.width + R>
  (MOVE.TO)
  >R v.tool.width + R>
  (LINE.TO) ;
\ SETUP LINER TOKENS

FIND (LINER.1BIT CONSTANT ^LINER.1BIT
FIND (LINER.2BIT CONSTANT ^LINER.2BIT
FIND (LINER.4BIT CONSTANT ^LINER.4BIT
FIND (LINER.8BIT CONSTANT ^LINER.8BIT
FIND LINER.BIT CONSTANT ^LINER.BIT

^LINER.BIT  LINE.TOKEN !


: C.LINE
  LINE.TOKEN @ EXECUTE ;


( draw.1.FRAME )                                ( 121669 YH )


: DRAW.1.FRAME
    POLY.POINTS LOCALS| THE.POINTS |
    TRANS.POINT TWO.VECTOR  ZCROSS.PRODUCT  0 >
    CULL.BACK? @ OR IF
      #POLY.POINTS @ 1- 0 DO
        THE.POINTS  TO.STACK DROP
        THE.POINTS 12 + TO.STACK DROP
        PUT.REDRAW
        THE.POINTS 12 + TO THE.POINTS
      LOOP
      THE.POINTS TO.STACK DROP
      POLY.POINTS TO.STACK DROP
      PUT.REDRAW
    THEN  ;

( have.drawn? )  ( 011138 YH )

CODE  HAVE.DRAWN?             \ index line ptr,  -- true or false
      0 D0 MOVEQ,             \ d0 is flag
     REDRAW@ A1 )#MOVE,         \ a1 is redraw@
     A1 () A0 LONG MOVE,        \ a0 id redraw@ @
       A1 POP,              \ pointer to current line
   D1 POP,              \ d1 is loop
     D1 3 # LONG ASR,         \ loop count = index / 8
     D1 1 LONG SUBQ,          \ loop ends on negative
     PL IF,               \ does nothing if zero
     BEGIN,               \ start loop
     A0 )+ D2 LONG MOVE,      \ fetch first array point
         A0 )+ D3 LONG MOVE,      \ fetch second point
     A1 () D3 LONG CMP,       \ compare first point
```

```
    EQ IF,            \ if the same then
      4 A1 I) D2 LONG CMP,  \ compare second point
      EQ IF,
        -1 D0 MOVEQ,     \ if vector matches set flag
      -1 D1 MOVEQ,      \ terminate loop
      THEN,
    THEN,
    D1 LOOP,            \ loop until done
  THEN,
  D0 PUSH,              \ return flag
  NEXT END-CODE           \ bye


create world.rect 0 , 0 ,

: Set.World.Clip
  get.window 16+ @rect
  scroll.width -
  zbufferx @ 1- v.tool.width + min >R
  scroll.width -
  zbuffery @ min >R
  v.tool.width +
  R> R>
  world.rect !rect
  world.rect clip.rect ;


: REDRAW
   0 LOCALS| R.POINTER |
   save.clip >R
   Set.World.Clip
   EDGE.ONLY @ 0= IF
     RECOUNT@ @ @ REDRAW.LENGTH min 8 +  0 DO
           I REDRAW@ @ + TO R.POINTER
       I R.POINTER HAVE.DRAWN?  NOT IF
       R.POINTER  6 + <W@
       R.POINTER  4 + <W@
             R.POINTER  2+  <W@
       R.POINTER      <W@
        C.LINE
      THEN
       8 +LOOP
    ELSE
    RECOUNT@ @ @ 2970 REDRAW.LENGTH 8 + DUP DRAWEND ! 0 DO
           I REDRAW@ @ + TO R.POINTER
       DRAWEND @ R.POINTER HAVE.DRAWN?  NOT IF
       R.POINTER  6 + <W@
       R.POINTER  4 + <W@
             R.POINTER  2 + <W@
       R.POINTER      <W@
        C.LINE
      THEN
   8 +LOOP
    THEN
  R> restore.clip ;



  : 5THFACE
    XCBOUNDS 4+ @  YCBOUNDS  4+ @  ZCBOUNDS    @
    XCBOUNDS    @  YCBOUNDS  4+ @  ZCBOUNDS    @
```

```
  XCBOUNDS    @  YCBOUNDS      @  ZCBOUNDS     @
  XCBOUNDS 4+ @  YCBOUNDS      @  ZCBOUNDS     @  ;

: 6THFACE
  XCBOUNDS    @  YCBOUNDS      @  ZCBOUNDS 4+  @
  XCBOUNDS    @  YCBOUNDS      @  ZCBOUNDS     @
  XCBOUNDS    @  YCBOUNDS  4+  @  ZCBOUNDS     @
  XCBOUNDS    @  YCBOUNDS  4+  @  ZCBOUNDS 4+  @  ;


                                          ( 050686 YH )
( CUBE.BOUNDS STRUCT: GX,LX,GY,LY,GZ,LZ )

: 1STFACE
  XCBOUNDS 4+ @  YCBOUNDS      @  ZCBOUNDS     @
  XCBOUNDS 4+ @  YCBOUNDS      @  ZCBOUNDS 4+  @
  XCBOUNDS 4+ @  YCBOUNDS  4+  @  ZCBOUNDS 4+  @
  XCBOUNDS 4+ @  YCBOUNDS  4+  @  ZCBOUNDS     @  ;

: 2NDFACE
  XCBOUNDS 4+ @  YCBOUNDS  4+  @  ZCBOUNDS 4+  @
  XCBOUNDS    @  YCBOUNDS  4+  @  ZCBOUNDS 4+  @
  XCBOUNDS    @  YCBOUNDS  4+  @  ZCBOUNDS     @
  XCBOUNDS 4+ @  YCBOUNDS  4+  @  ZCBOUNDS     @  ;

                                          ( 050686 YH )
: 3RDFACE
  XCBOUNDS 4+ @  YCBOUNDS      @  ZCBOUNDS 4+  @
  XCBOUNDS    @  YCBOUNDS      @  ZCBOUNDS 4+  @
  XCBOUNDS    @  YCBOUNDS  4+  @  ZCBOUNDS 4+  @
  XCBOUNDS 4+ @  YCBOUNDS  4+  @  ZCBOUNDS 4+  @  ;

: 4THFACE
  XCBOUNDS 4+ @  YCBOUNDS      @  ZCBOUNDS     @
  XCBOUNDS    @  YCBOUNDS      @  ZCBOUNDS     @
  XCBOUNDS    @  YCBOUNDS      @  ZCBOUNDS 4+  @
  XCBOUNDS 4+ @  YCBOUNDS      @  ZCBOUNDS 4+  @  ;


                                          ( 011138 YH )
: TOTAL.TRANS   \ relative x y z -- absolute x y z
  CENTER.VECTOR
  SWIVEL
  SCALER
  OUT
  NPROJECT  ;

: TO.SHADE/POLY.POINTS
  TOTAL.TRANS
  3DUP POLY.POINTS FROM.STACK
       SHADE.POINTS FROM.STACK
 TOTAL.TRANS
  3DUP POLY.POINTS 12 + FROM.STACK
       SHADE.POINTS 12 + FROM.STACK
 TOTAL.TRANS
  3DUP POLY.POINTS 24 + FROM.STACK
       SHADE.POINTS 24 + FROM.STACK
 TOTAL.TRANS
```

```
 3DUP POLY.POINTS 36 + FROM.STACK
     SHADE.POINTS 36 + FROM.STACK  ;

                                              ( 050686 YH )

: NCUBE.FRAME 0 RECOUNT@ @ !  0 LAST.DRAWN !
  REDRAW@ @ REDRAW.LENGTH ERASE  8 SECTION !
4 #POLY.POINTS !
  1stface TO.SHADE/POLY.POINTS  DRAW.1.FRAME
  2NDface TO.SHADE/POLY.POINTS  DRAW.1.FRAME
  3RDface TO.SHADE/POLY.POINTS  DRAW.1.FRAME
  4thface TO.SHADE/POLY.POINTS  DRAW.1.FRAME
  5THface TO.SHADE/POLY.POINTS  DRAW.1.FRAME
  6THface TO.SHADE/POLY.POINTS  DRAW.1.FRAME ;


: FRAME.ONE.SECTION
  0 SIDE !              \ side is the offset for the cross.section loop
  TRIANGLE.MESH? @ IF
     3 #POLY.POINTS !          \ set the number of points to four for the mesh
    AllPoints 4+ @ 1 DO
          SIDE @
      SECTION @ +
            AllPoints +  DUP      \ address of this point on this cross.section
      TO.TRI.1POINTS         \ write to shade points
            DRAW.1.FRAME        \ draw the poly
      TO.TRI.2POINTS         \ write to shade points
            DRAW.1.FRAME        \ draw the poly
            SIDE @
      3POINT.LENGTH + SIDE !    \ increment the cross.section offset
    LOOP
  ELSE
   4 #POLY.POINTS !           \ set the number of points to four for the mesh
    AllPoints 4+ @ 1 DO
          SIDE @
      SECTION @ +
            AllPoints +         \ address of this point on this cross.section
      TO.THE.POINTS
            DRAW.1.FRAME        \ draw the poly
            SIDE @
      3POINT.LENGTH + SIDE !    \ increment the cross.section offset
         LOOP
   THEN ;


: FRAME.FRONT.CAP              \ writes complex poly front cap if needed
  3POINT.LENGTH            \ length of point record
  AllPoints 8+ SECTION.INC @ 2* +  \ start of array
  LOCALS| THE.ALL OFF.POINT |
  FRONT.CAP? @ IF           \ if we are using the cap...
     0 #POLY.POINTS !        \ set the start edge count to zero
     AllPoints 4+ @  0 DO      \ loop through the cross section
       THE.ALL
     OFF.POINT -         \ we are counting backward...
       >POLY.POINTS         \ write the the points
         OFF.POINT 3POINT.LENGTH +   \ increment the offset
     TO OFF.POINT
     LOOP               \ loop until done
  DRAW.1.FRAME              \ draw the poly
  ELSE
    FRAME.ONE.SECTION       \ else draw the current.section
```

```
  THEN ;


\ end cap

 : FRAME.END.CAP           \ writes complex poly end cap if needed
   0                \ start at zero offset
   AllPoints 8+
   SECTION.INC @
   AllPoints @ 2- * +           \ the start address of the cross section for the cap
   LOCALS| THE.ALL OFF.POINT |
   BACK.CAP? @ IF             \ if we are using the cap...
      0 #POLY.POINTS !        \ zero the edge count for the poly
      AllPoints 4+ @  0 DO      \ loop through the cross.section points
        THE.ALL
      OFF.POINT +         \ add start of the array to the offset
        >POLY.POINTS          \ write the points to shade and poly.points
           OFF.POINT 3POINT.LENGTH +  \ increment the offset
      TO OFF.POINT
      LOOP                \ loop till done
    DRAW.1.FRAME          \ draw the poly
  ELSE
    FRAME.ONE.SECTION       \ else draw the current.section
  THEN ;


\ poly mesh  Last Revision: 02/25/88  11:08:43 AM   YH
\ to handle complex poly endcaps on object
\ flag use.cap? must be set for this option to be used

0 CONSTANT  ^NPOLY.FRAME

 : (NPOLY.FRAME)              \ draws poly mesh object from AllPoints
  CUBE.FLAG @ CULL.BACK? @ OR IF      \ if large object, or non back culled object
    CULL.BACK? @ >R
    0 CULL.BACK? !
    NCUBE.FRAME            \ use cube cursor
    R> CULL.BACK? !
  ELSE                 \ if small object then show actual wireframe
    0 RECOUNT@ @ !  0 LAST.DRAWN !
      REDRAW@ @ REDRAW.LENGTH ERASE
    TRANS.ALL.POINTS 2DROP        \ returns min and max z
    PROJECT.ALL.POINTS          \ do the projection
      8 SECTION !             \ set start increment to first point in array
      AllPoints 4+ @            \ fetch count of points in a cross section
    3POINT.LENGTH *           \ * the point record length, is a length of a section
    SECTION.INC !
    AllPoints @ 2 > IF
      FRAME.FRONT.CAP         \ test and do the front cap if needed,
      SECTION @ SECTION.INC @ -
      SECTION !           \ increment the pointer
      AllPoints @  3 DO       \ loop leaves out fron and end caps
          FRAME.ONE.SECTION     \ draw the current cross.section
          SECTION @
        SECTION.INC @ + SECTION ! \ increment the path offset
        LOOP
      FRAME.END.CAP           \ check for an end.cap and write if needed
      4 #POLY.POINTS !
    ELSE
    AllPoints @ 1 > IF
      FRAME.FRONT.CAP         \ draw front.cap if just 2 path points
    THEN
   THEN
   THEN ;
```

```
FIND (NPOLY.FRAME)  ' ^NPOLY.FRAME !

: NPOLY.FRAME ^NPOLY.FRAME EXECUTE ;

: POLY.FRAME NPOLY.FRAME REDRAW ;
```

```
\ fixed math for 68000

 VARIABLE REG1 8 ALLOT
 VARIABLE REG2 8 ALLOT

HEX

 :  FIX.RATIO, ASSEMBLER                 \ dn1 dn2 -- term in dn2
      D7 RPUSH,
      0 D7 MOVEQ,
      REG1 2! REG2 2!
      REG2 2@ D7 REG1 2@ LONG MULS,
      D7 SWAP,
      0 # D7 WORD MOVE,
      0 # REG1 2@ WORD MOVE,
      REG1 2@ SWAP,
      D7 REG1 2@ LONG ADD,
      D7 RPOP,  ;


 :  FIX.MUL, ASSEMBLER                   \ dn1 dn2 -- term in dn2
      REG1 2! REG2 2!
      REG2 2@ LONG EXT,
      REG2 2@ REG1 2@ REG1 2@ LONG MULS, ;


:  FIX.DIV,  ASSEMBLER
   REG1 2! REG2 2!
  REG2 2@ LONG EXT,
  REG2 2@ LONG TST, NE IF,
    REG1 2@ D0 LONG MOVE,
    D0 SWAP,
    D0 LONG EXT,
    REG1 2@ SWAP,
    0 # REG1 2@ WORD MOVE,
    REG2 2@ D0 REG1 2@ LONG DIVS,
  ELSE,
    0  REG1 2@ MOVEQ,
  THEN, ;

 :  L.FIX.DIV,  ASSEMBLER
   REG1 2! REG2 2!
  REG2 2@ LONG TST, NE IF,
    REG1 2@ D0 LONG MOVE,
    D0 SWAP,
    D0 LONG EXT,
    REG1 2@ SWAP,
    0 # REG1 2@ WORD MOVE,
    REG2 2@ D0 REG1 2@ LONG DIVS,
  ELSE,
    0  REG1 2@ MOVEQ,
  THEN, ;


 \ ldiv... 32 bit / 16 bit --- 32 bit

 :  L.DIV, ASSEMBLER                 \ dn1 dn2 -- term in dn2
   REG1 2! REG2 2!
   REG2 2@ LONG EXT,
   REG2 2@ LONG TST, NE IF,
     REG2 2@ D0 REG1 2@ LONG DIVSL,
   ELSE,
     0 REG1 2@ MOVEQ,
```

```
THEN, ;

DECIMAL

CODE L.DIV
   D2 POP, D1 POP,
   D2 D1 L.DIV,
   D1 PUSH,
 NEXT END-CODE

CODE FIX.DIV
   D2 POP, D1 POP,
   D2 D1 FIX.DIV,
   D1 PUSH,
 NEXT END-CODE

CODE FIX.MUL
   D2 POP, D1 POP,
   D2 D1 FIX.MUL,
   D1 PUSH,
 NEXT END-CODE

CODE FIX.RATIO
   SAVE.REGS
   D2 POP, D1 POP,
   D2 D1 FIX.RATIO,
   D1 PUSH,
   RESTORE.REGS
NEXT END-CODE
```

```
ANEW ASSM.UTILS

( ASSEMBLER INLINE UTILS )                        ( 012686 YH )

CR ." Loading Assembler Utils..."


    : A.SIZE.OF      \  LENGTH IN BYTES I --- ASSEMBLER CODE SIZE
    CASE
    1 OF 0 ENDOF
    2 OF 1 ENDOF
    4 OF 2 ENDOF
    ENDCASE ;

\ for TMON readable code in CODE resources

: MOVE.JUST.LETTERS
  0 LOCALS| PTR SIZE DEST SOURCE |
  SIZE 0 DO
    SOURCE I + C@ ASCII A 1- >
    SOURCE I + C@ ASCII Z 1+ < AND
    PTR 9 < AND IF
      SOURCE I + C@ DEST PTR + C!
      PTR 1+ TO PTR
    THEN
  LOOP ;

: PROC.START ASSEMBLER
  0 A6 LINK,  ;

: PROC.END ASSEMBLER
  A6 UNLK,
  RTS,
  HERE 8 ALLOT
  DUP 8 BLANKS
  LATEST 1+ SWAP
  LATEST C@ MOVE.JUST.LETTERS
  0 W, ;


\ assembly macros

: SP@,     ASSEMBLER   1- 4* SP I) ;
: DUP,     ASSEMBLER   SP () SP -) LONG MOVE, ;
: DROP,    ASSEMBLER   SP 04 LONG ADDQ, ;
: ROT,     ASSEMBLER   08 SP I) D0  LONG MOVE,
                       04 SP I)  08 SP I) LONG MOVE,
                       SP () 04 SP I) LONG MOVE,
                       D0  SP () LONG MOVE, ;
: NSWAP,   ASSEMBLER   04 SP I) D0  LONG MOVE,
                       SP () 04 SP I) LONG MOVE,
                       D0  SP () LONG MOVE, ;
: OVER,    ASSEMBLER   04 SP I)  SP -) LONG MOVE, ;
: 2DUP,    ASSEMBLER   OVER, OVER, ;
: 2DROP,   ASSEMBLER   SP 08 LONG ADDQ, ;
: >R,      ASSEMBLER   SP )+ RP -) LONG MOVE, ;
: R>,      ASSEMBLER   RP )+ SP -) LONG MOVE, ;
: ABS,     ASSEMBLER
                 2DUP >R >R LONG TST, MI IF, R> R> LONG NEG, THEN, ;
```

```
            >R 0 3 PICK 3 PICK MOVEQ, R> ELSE,
            >R DIVS, R> THEN, ;


 : RDIVS,   ASSEMBLER
    LOCALS| DEND DIVI ISOR DIV |
    D7 RPUSH,
    DIV ISOR D7 WORD MOVE,
    D7 LONG EXT,
    D7 1 # LONG ASR,
    D7 LONG TST, MI IF,
      D7 LONG NEG, THEN,
    DIVI DEND LONG TST, MI IF,
      D7 LONG NEG, THEN,
    D7 DIVI DEND LONG ADD,
    DIV ISOR DIVI DEND DIVS,
    D7 RPOP,  ;


 : TDIVU,  ASSEMBLER
            4 PICK 4 PICK WORD TST, EQ IF,
            >R 0 3 PICK 3 PICK MOVEQ, R> ELSE,
            >R DIVU, R> THEN, ;


CODE EXT  D0 POP, D0 LONG EXT, D0 PUSH, NEXT END-CODE

CODE NEG  D0 POP, D0 LONG NEG, D0 PUSH, NEXT END-CODE


CODE  /
   D0 POP, NE IF,
   D1 GET,
   MI IF,
    -1 D1 MOVEQ,
   ELSE,
    0 D1 MOVEQ,
   THEN,
   D1 PUSH,
   D0 PUSH,
   IP RP -) LONG MOVE,
     >FORTH M/MOD >CODE
   RP )+ IP LONG MOVE,
   D0 POP,
  THEN,
   D0 PUT,
  NEXT END-CODE

  CODE  /,
    >R,
    D0 POP, NE IF,
    D1 GET,
    MI IF,
     -1 D1 MOVEQ,
    ELSE,
     0 D1 MOVEQ,
    THEN,
    D1 PUSH,
    D0 PUSH,
    IP RP -) LONG MOVE,
```

```
    >FORTH M/MOD >CODE
  RP )+ IP LONG MOVE,
  DO POP,
 THEN,
  DO PUT,
 R>,
 RTS, END-CODE


HEX   A8DD MT SET.EMPTY.REGION  ( rgn -- )   DECIMAL

: WINDOW.REGION.EMPTY
  GET.WINDOW  122 + @  SET.EMPTY.REGION  ;
  ( THIS ROUTINE PREVENTS AN UPDATE OF )
  ( THE CURRENTLY SELECTED WINDOW      )

  HEX

 : NUMBER>$              ( NUMBER | COUNT, ADDRESS OF STRING )
  BASE @ 10 = IF
  DUP ABS
  <# #S SWAP SIGN #>
  ELSE  <# #S #>
  THEN ;

 :  AUTO.NUMBER!          ( NUMBER, ADDRESS | STORES CHARS AT ADDRESS )
  >R  NUMBER>$
  8 MIN DUP 8 SWAP - R> + SWAP CMOVE ;



 2 BASE ! : CLEAR, 1000000000 OR ;  DECIMAL

 CREATE NIL.NAME 0 ,

HEX

   32 CONSTANT RES.PURGABLE


 CODE HAND.TO.HAND     \ handle copying trap
    A0 POP,         \ get handle
    A9E1 W,         \ copy handle
    A0 PUSH,        \ push handle
    D0 PUSH,        \ push error code
    NEXT END-CODE


 CODE NEW.CLEAR.HANDLE   \ creates, clears handle
    D0 POP,         \ d0 has length of new handle
    A122  CLEAR, W,     \ trap for new handle which clears
   A0 PUSH,        \ push new handle
    D0 PUSH,        \ push error code
    NEXT END-CODE

DECIMAL
```

```
( INLINE CODE UTILS, Olit, popoff, geti), )        ( 012786 yh )

 : LIT, ASSEMBLER
      # SP -) LONG MOVE, ;


 : olit, assembler
    NEXT.PTR - # SP -) LONG MOVE, ;

 : POPOFF,  ASSEMBLER
        2DUP NP 2SWAP LONG MOVE,
         SP )+  2SWAP LONG ADDA, ;

 : GETI), ASSEMBLER  ROT 4 * ROT ROT
        2DUP NP 2SWAP LONG MOVE,
        SP I) 2SWAP LONG ADDA, ;


 :   )#MOVE,    ASSEMBLER
      2DUP  NP   2SWAP LONG MOVE,
      ROT  NEXT.PTR  -  #  2SWAP  LONG ADDA,  ;


( RESTORE.REGS  SAVE.REGS )                      ( 011038 YH )


  : RPUSH,  ASSEMBLER  RP -) LONG MOVE, ;
  : RPOP,   ASSEMBLER  >R >R RP )+ R> R> LONG MOVE, ;


 : RESTORE.REGS  ASSEMBLER
  RP )+ REGLIST D3-D7/A2  LONG MOVEM,  ;

 : SAVE.REGS    ASSEMBLER
  REGLIST D3-D7/A2 RP -)  LONG MOVEM,   ;

 : XRESTORE.REGS  ASSEMBLER
  RP )+ REGLIST D3-D7/A2/A4 LONG MOVEM,  ;

 : XSAVE.REGS    ASSEMBLER
  REGLIST D3-D7/A2/A4 RP -)  LONG MOVEM,   ;


 ( 3DUP              )                    ( 102785 YH )

  CODE  3DUP
       SP 08 LONG SUBQ, SP 04 LONG SUBQ,
       06 SP@, 03 SP@, LONG MOVE,
       05 SP@, 02 SP@, LONG MOVE,
       04 SP@, SP () LONG MOVE, NEXT END-CODE

   CODE  4DUP
       SP 08 LONG SUBQ, SP 08 LONG SUBQ,
       08 SP@, 04 SP@, LONG MOVE,
       07 SP@, 03 SP@, LONG MOVE,
       06 SP@, 02 SP@, LONG MOVE,
       05 SP@, SP () LONG MOVE, NEXT END-CODE


   : TDIVS,  ASSEMBLER
              4 PICK 4 PICK WORD TST, EQ IF,
```

```
anew -averagenormal2-

    CODE TO.THE.POINT ASSEMBLER
    SAVE.REGS
    A0 POP,
    SP )+ 8 A0 I) LONG MOVE,
    SP )+ 4 A0 I) LONG MOVE,
    SP )+ A0 () LONG MOVE,
    RESTORE.REGS
    NEXT END-CODE


: to.the.points, assembler
   #POLY.POINTS A0 )#MOVE,
   4 # A0 () LONG MOVE,
   A0 POP,
   SECTION.INC A1 )#MOVE,
   A1 () D3 LONG MOVE,
   SHADE.POINTS A1 )#MOVE,
   A0 () A1 () LONG MOVE,
   4 A0 I) 4 A1 I) LONG MOVE,
   8 A0 I) 8 A1 I) LONG MOVE,

   12 A0 I) 12 A1 I) LONG MOVE,
   16 A0 I) 16 A1 I) LONG MOVE,
   20 A0 I) 20 A1 I) LONG MOVE,

   D3 A0 LONG ADDA,
   24 # A1 LONG ADDA,
   12 A0 I) A1 () LONG MOVE,
   16 A0 I) 4 A1 I) LONG MOVE,
   20 A0 I) 8 A1 I) LONG MOVE,

   A0 () 12 A1 I) LONG MOVE,
   4 A0 I) 16 A1 I) LONG MOVE,
   8 A0 I) 20 A1 I) LONG MOVE,
  ;

  : two.vector,   assembler
    POLYBLOCK a0 )#move,
    10 8 *  # 0 +POLYSELECT A0 I) LONG MOVE,
    A0 PUSH,
    A0 () A0 LONG MOVE,
    A0 () A0 LONG MOVE,
    A0 () JSR, ;


  : cross.product,  assembler
    POLYBLOCK a0 )#move,
    11 8 *  # 0 +POLYSELECT A0 I) LONG MOVE,
    A0 PUSH,
    A0 () A0 LONG MOVE,
    A0 () A0 LONG MOVE,
    A0 () JSR, ;

  : ((normalize,)) assembler
    POLYBLOCK a0 )#move,
    14 8 *  # 0 +POLYSELECT A0 I) LONG MOVE,
    A0 PUSH,
    A0 () A0 LONG MOVE,
    A0 () A0 LONG MOVE,
    A0 () JSR, ;
```

```
code calc.section.normal
  xsave.regs
  d6 pop,                  \ d6 is the section
  ' ^ALLPOINTS  A2 )#MOVE,        \ a2 is ^ ^all.points
  a2 () A2 LONG MOVE,           \ a2 is ^allPoints
  A2 () A2 LONG MOVE,           \ a2 is allpoints
  ' ^normalpoints  A4 )#MOVE,
  a4 () A4 LONG MOVE,
  A4 () A4 LONG MOVE,
  4 a2 I) d7 long move,
  d7 2 long subq,
  pl if.l,
    begin,
      d6 0 long a2 @i) pea,
      TO.THE.POINTS,
      two.vector,
      cross.product,
      ((normalize,))
      sp )+ d6 8 long a4 @i) long move,
      sp )+ d6 4 long a4 @i) long move,
      sp )+ d6 0 long a4 @i) long move,
      d6 12 LONG ADDI,
    D7 loop,
    d6 -12 long a4 @i) d6 0 long a4 @i) long move,
    d6  -8 long a4 @i) d6 4 long a4 @i) long move,
    d6  -4 long a4 @i) d6 8 long a4 @i) long move,
  then,
  xrestore.regs
  next end-code


: SET.ALLNORMALS                \ draws poly mesh object from AllPoints
 4 #POLY.POINTS !
   8 SECTION !                 \ set start increment to first point in array
   AllPoints 4+ @                \ fetch count of points in a cross section
 3POINT.LENGTH *               \ * the point record length, is a length of a section
 SECTION.INC !
 AllPoints @  1 DO             \ loop leaves out fron and end caps
     SECTION @
   CALC.SECTION.NORMAL          \ draw the current cross.section
     SECTION @
   SECTION.INC @ + SECTION !      \ increment the path offset
   LOOP
 0 SIDE !
 AllPoints 4+ @  0 DO            \ loop leaves out fron and end caps
     SIDE @                   \ fills the end row with normals
   SECTION @ +
   NormalPoints + dup
         SECTION.INC @ - swap
   3POINT.LENGTH cmove
   SIDE @
   3POINT.LENGTH + SIDE !         \ increment the cross.section offset
     LOOP  ;


code PHONG.SECTION.NORMAL
  save.regs
  d6 pop,                  \ d6 is the section
  section.inc a0 )#move,
  a0 () d3 long move,
  ' ^normalpoints  A2 )#MOVE,
  a2 () A2 LONG MOVE,
  A2 () A2 LONG MOVE,
```

```
d6 a2 long adda,
d3 a2 long adda,
' ^allpoints  A1 )#MOVE,
a1 () A1 LONG MOVE,
A1 () A1 LONG MOVE,
d3 long neg,
4 a1 I) d7 long move,
d7 2 long subq,
pl if,
  a2 push,
  begin,
    -12 # a2 long adda,

    a2 () d0 long move,        \ average x normal
    -12 a2 i) d0 long add,
    d3 0 a2 @i) d0 long add,
    d3 -12 a2 @i) d0 long add,
    d0 2 # long asr,
    d0 a2 () long move,

    4 a2 I) d0 long move,        \ average y normal
    -8 a2 i) d0 long add,
    d3 4 a2 @i) d0 long add,
    d3 -8 a2 @i) d0 long add,
    d0 2 # long asr,
    d0 4 a2 i) long move,        \ z is left as is


   D7 loop,
   -12 # a2 long adda,
   a0 pop,
   -12 a0 i) a2 () long move,
   -8  a0 i) 4 a2 i) long move,
   -4  a0 i) 8 a2 i) long move,
  then,
  restore.regs
  next end-code


: MAKE.PHONG.NORMALS            \ draws poly mesh object from AllPoints
    AllPoints 4+ @              \ fetch count of points in a cross section
  3POINT.LENGTH *              \ * the point record length, is a length of a section
  SECTION.INC !
  AllPoints 4+ @
  AllPoints @ *
  3POINT.LENGTH *
  SECTION.INC @ -
  8+
  SECTION !
  AllPoints @  1  DO            \ loop includes front and end caps
    SECTION @
      PHONG.SECTION.NORMAL        \ draw the current cross.section
      SECTION @
    SECTION.INC @ - SECTION !     \ increment the path offset
    LOOP
  4 #POLY.POINTS !   ;


  : AVERAGE.NORMALS
    locals| the.vertex |
    the.vertex @
    the.vertex 3POINT.LENGTH - @ +
    the.vertex SECTION.INC @ - 3POINT.LENGTH - @ +
```

```
the.vertex SECTION.INC @ - @ -
the.vertex 4+ to the.vertex

the.vertex @
the.vertex 3POINT.LENGTH - @ +
the.vertex SECTION.INC @ - 3POINT.LENGTH - @ +
the.vertex SECTION.INC @ - @ +
the.vertex 4+ to the.vertex

the.vertex @
the.vertex 3POINT.LENGTH - @ +
the.vertex SECTION.INC @ - 3POINT.LENGTH - @ +
the.vertex SECTION.INC @ - @ +
;


: AVERAGE.SECTION.NORMAL
 SECTION.INC @
 3POINT.LENGTH  - SIDE !
 4 #POLY.POINTS !            \ set the number of points to four for the mesh
   AllPoints 4+ @ 1 DO
        SIDE @
     SECTION @ +
          NormalPoints +          \ address of this point on this cross.section
     AVERAGE.NORMALS
     NORMALIZE
     SIDE @
     SECTION @ +
          NormalPoints +
     TO.THE.POINT
          SIDE @
     3POINT.LENGTH - SIDE !      \ increment the cross.section offset
     LOOP
  SECTION @
  SECTION.INC @ 3POINT.LENGTH  - +
      NormalPoints +
  SECTION @
      NormalPoints +             \ address of this point on this cross.section
  3POINT.LENGTH cmove ;


 : MAKE.AVERAGE.NORMALS            \ draws poly mesh object from AllPoints
    AllPoints 4+ @               \ fetch count of points in a cross section
  3POINT.LENGTH *              \ * the point record length, is a length of a section
  SECTION.INC !
  AllPoints 4+ @
  AllPoints @ *
  3POINT.LENGTH *
  SECTION.INC @ -
  8+
  SECTION !
  AllPoints @  1  DO           \ loop includes front and end caps
      AVERAGE.SECTION.NORMAL       \ draw the current cross.section
      SECTION @
    SECTION.INC @ - SECTION !     \ increment the path offset
    LOOP
  4 #POLY.POINTS !   ;
```

```
\ BACK PORT HANDLING
\ Last Revision: 09/05/87  04:48:53 PM   YH

CR ." Loading backport handling "


  CREATE ENVIR.BITS 0 ,
  CREATE ^ENVIR.BITS 0 ,
  NEW.WINDOW ENVIR.CPORT
  256 constant ENVIR.DIAMETER


  :  PIXMAP.OF 2+ @ @ ;
  : ^PIX.MAP.OF 2+ @ ;

    : OCLEAR.ZBUFF  CLEAR.ZBUFF ;
    : CLEAR.ZBUFF   CLEAR.ZBUFF CLEAR.OBUFF  ;


  ( SET.SAVE.BITS )                                  ( 111086 YH )

     VARIABLE xbutton.offset  40 xbutton.offset !
      CREATE SAVE.BITS
    0 , ZBUFFERX @ 8 / W,
    0 W, 0 W, ZBUFFERY @ W, ZBUFFERX @ W,
    0 W, 0 W, ZBUFFERY @ W, ZBUFFERX @ W,


   2 CONSTANT PATCH.INC


   VARIABLE TEMP.RECT 16 ALLOT
   VARIABLE OFF.RECT  16 ALLOT


  \ define normalpoints


  \ patch allpoint init routines


  : SET.ALL.POINTS
    MAX.TYPE.POINTS DUP * 3POINT.LENGTH * 16 +
    ' ALL.POINT.LENGTH !
    ALL.POINT.LENGTH HEAP.VARIABLE DROP
    ' ^ALLPOINTS !
    ^ALLPOINTS HANDLE.SIZE 0 > NOT IF
      0 ' ^ALLPOINTS !
    THEN ;


  : CLEAR.ALL.POINTS
    ^ALLPOINTS 0= not if
      ^ALLPOINTS UNLOCK.HANDLE
      ^ALLPOINTS TO.HEAP
      0 ' ^ALLPOINTS !
    then ;
```

```
: SET.NORMAL.POINTS
  ALL.POINT.LENGTH HEAP.VARIABLE DROP
  ' ^NormalPoints !  ;


: CLEAR.NORMAL.POINTS
  ^NormalPoints 0= NOT IF
    ^NormalPoints UNLOCK.HANDLE
    ^NormalPoints TO.HEAP
    0 ' ^NormalPoints !
  THEN ;




( SAVE.WINDOW,  RESTORE.WINDOW )                 ( 081686 YH )


: SET.TEMP.RECT         \ sets temp.rect to clipping rect for the world.output
  GET.WINDOW 16 +
  TEMP.RECT 8 CMOVE
  TEMP.RECT 2 + W@ EXT
  V.TOOL.WIDTH + 1+
  TEMP.RECT 2 + W!
  TEMP.RECT 4 + W@ EXT
  SCROLL.WIDTH -
  ZBUFFERY @ 1- MIN
  TEMP.RECT 4 + W!
  TEMP.RECT 6 + W@ EXT
  SCROLL.WIDTH -
  ZBUFFERX @ V.TOOL.WIDTH + 2- MIN
  TEMP.RECT 6 + W! ;


: MAKE.OFFSET.RECT      \ X Y RECT -- RECT
  LOCALS| N.RECT N.Y N.X |
  N.RECT @RECT
  N.X + >R
  N.Y + >R
  N.X + >R
  N.Y + R> R> R>
  OFF.RECT !RECT
  OFF.RECT ;


: BACK.BITS
  CURRENT.BACKPORT @ 2+ @ @ ;


GLOBAL (LAST.WINDOW)
GLOBAL (LAST.DEVICE)


: ENTER.CURRENT.BACKPORT
  GET.WINDOW TO (LAST.WINDOW)
  GETGDEVICE TO (LAST.DEVICE)
  BACK.GDEVICE @ SETGDEVICE
  CURRENT.BACKPORT @
  (WINDOW) ;

: EXIT.CURRENT.BACKPORT
  (LAST.DEVICE) SETGDEVICE
```

```
(LAST.WINDOW)
?ACTIVE.WPTR IF
  (LAST.WINDOW) (WINDOW)
THEN ;


:  DISPLAY.WORLD        \ Displays the background port in the current output window
 ^POLY.BITS @
0>  IF
8 PENMODE
SAVE.CLIP >R         \ save current clipping region
SET.TEMP.RECT        \ make new clipping rect
TEMP.RECT CLIP.RECT     \ set new clipping rect
  BACK.BITS            \ fetch current background bitmap ( or pixmap )
GET.WINDOW 2+        \ fetch current window
    V.TOOL.WIDTH NEG 0
TEMP.RECT
MAKE.OFFSET.RECT
TEMP.RECT  0 0         \ use temp rect for destination and source of blit
    COPY.BITS            \ do the blit
R> RESTORE.CLIP        \ restore the old clipping region
V.TOOL.WIDTH -1        \ display the bounds of the current backport
ZBUFFERX @ V.TOOL.WIDTH + 1-
  ZBUFFERY @
FRAME RECTANGLE
 THEN ;


:  DISPLAY.PRINT
 ^POLY.BITS @ 0>  IF
   BACK.BITS
   GET.WINDOW 2+
       BACK.BITS  6 + DUP
    0 0 COPY.BITS
 THEN ;



: CLEAR.BACK.PORT
  ^POLY.BITS @  0 = NOT  IF
    ^POLY.BITS @ UNLOCK.HANDLE
    ^POLY.BITS @ TO.HEAP
    0 ^POLY.BITS !
  THEN ;


: DISPOSE.BACK.PORT
  ^POLY.BITS @  0 = NOT  IF
    ^POLY.BITS @ UNLOCK.HANDLE
    ^POLY.BITS @ TO.HEAP
    0 ^POLY.BITS !
  THEN
  BACK.GDEVICE @ 0 = NOT IF
    BACK.GDEVICE @ DISPOSGDEVICE
    0 BACK.GDEVICE !
  THEN ;


: JUST.SMALL  64 64 ;
FIND  JUST.SMALL CONSTANT ^JUST.SMALL

CREATE RECONFIG.TOKEN ^JUST.SMALL ,
CREATE EXIT.TOKEN  FIND BYE ,
```

```
: (RESTORE.HEAP)
  CLEAR.ALL.POINTS
  CLEAR.NORMAL.POINTS
  CLEAR.BACK.PORT
  ^ZBUFFER @ 0 = NOT IF
    ^ZBUFFER @ UNLOCK.HANDLE
    ^ZBUFFER @ TO.HEAP
    0 ^ZBUFFER !
  THEN
  (^SCAN.ARRAY) @ 0 = NOT IF
    (^SCAN.ARRAY) @ UNLOCK.HANDLE
    (^SCAN.ARRAY) @ TO.HEAP
    0 (^SCAN.ARRAY) !
  THEN  ;


: DISPOSE.HEAP
  CLEAR.ALL.POINTS
  CLEAR.NORMAL.POINTS
  DISPOSE.BACK.PORT
  ^ZBUFFER @ 0 = NOT IF
    ^ZBUFFER @ UNLOCK.HANDLE
    ^ZBUFFER @ TO.HEAP
    0 ^ZBUFFER !
  THEN
  (^SCAN.ARRAY) @ 0 = NOT IF
    (^SCAN.ARRAY) @ UNLOCK.HANDLE
    (^SCAN.ARRAY) @ TO.HEAP
    0 (^SCAN.ARRAY) !
  THEN   ;


: HANDLE.BACKPORT.ERROR
  DISPLAY.MEMORY.ALERT STOP.ALERT
    IALERT @  1 = IF
      RECONFIG.TOKEN @ EXECUTE
  ELSE
    DISPOSE.HEAP
    ZERO.SCRAP
    EXIT.TOKEN @ execute
    BYE
  THEN ;


: OPEN.ENVIR.CPORT                              \ window -- opens as background color port
  ENVIR.CPORT
    0 get.window 0 0
  LOCALS| the.map the.clut LAST.WIN THE.CBITS THE.WIN  |     \ define locals
  THE.WIN  OPENCPORT                          \ open the color port
  THE.WIN  ^PIX.MAP.OF  TO THE.CBITS                 \ cbits = ^Pix.map
  DFLTQDPROCS THE.WIN  104 + !                  \ set the default graphic procedures
  BACK.GDEVICE @ @ +GDPMAP @  TO THE.MAP              \ find the gdevice pixmap
  THE.MAP @ +PMTABLE @ TO THE.CLUT
  THE.CLUT THE.CBITS @ CTabHandle !                  \ Set the clut to the backGDevice
  0 0 ENVIR.DIAMETER DUP                       \ its a square
  THE.CBITS @ UPBOUNDS !RECT                    \ set the bounds of the pixmap
  8 THE.CBITS @ PIXELSIZE W!                    \ set the pixel size
  8 THE.CBITS @ CMPSIZE W!
  THE.CBITS @ RIGHTBOUNDS W@
  THE.CBITS @ LEFTBOUNDS W@ -
  8 * 15 + 16 / 2*
    ROW.BIT +
  THE.CBITS @ ROWBYTES W!                      \ store in the pixmap
```

```
LAST.WIN (WINDOW) ;


: INIT.ENVIR.PORT
  ENVIR.CPORT 2+ @ IF
    ENVIR.CPORT CLOSE.WINDOW
    0 ENVIR.CPORT 2+ !
  THEN
  ENTER.CURRENT.BACKPORT
  OPEN.ENVIR.CPORT
  EXIT.CURRENT.BACKPORT ;


: COLOR.WARNING
  " Please set the color mode to "
  " 256 colors or more..."
  "" "" 401 issuealert drop ;


: Init.Poly.heap              \ -- flag
  OUTPUT.DEPTH @ LAST.DEPTH !
    Load.Color.PolyProcs
  DFLTQDPROCS C.BACKPORT  104 + !   \ set the default graphic procedures
  C.BACKPORT CURRENT.BACKPORT !
  0 ALT.POLY !
  OUTPUT.DEPTH @ 8 <  IF
    COLOR.WARNING
  THEN
    (RESTORE.HEAP)
  INIT.ZBUFFER
  INIT.BACKPORT
  INIT.SCAN.ARRAY
  SET.ALL.POINTS
  SET.NORMAL.POINTS
  ^POLY.BITS @ 0=  not if
    INIT.ENVIR.PORT
  then
  ^normalpoints 0=
  ^AllPoints 0=     OR
  (^SCAN.ARRAY) @ 0= OR
  ^ZBUFFER @      0=  OR
  ^POLY.BITS @ 0=     OR ;


: RESIZE.BACKPORT             \ x y -- resizes back port
  LOCALS| NEW.Y NEW.X |
  BEGIN
  NEW.Y ZBUFFERY !
  NEW.X ZBUFFERX !
  Init.Poly.heap
  0 ?HEAP.SIZE MINHEAPSIZE < OR
  IF  HANDLE.BACKPORT.ERROR
    TO NEW.Y TO NEW.X  0
  ELSE
    -1
  THEN
  UNTIL  ;


: INIT.BACK.PORT
  ZBUFFERX @ ZBUFFERY @ RESIZE.BACKPORT  ;


: ZBUFFER.EXISTS?
```

```
^AllPoints 0=
(^SCAN.ARRAY) @ 0= OR
^ZBUFFER @      0= OR
^POLY.BITS @ 0=    OR ;
```

```
\ poly drawing for zbuffer and object buffer only

." Loading Zbuffer poly drawing "
cr


PROC.START

CODE (A.POLYSCAN)   ( STARTY ENDY -- )
  >R,
     2 SP@, D7 LONG MOVE,
  D7 01 LONG ADDQ,                   \ first line free for backscan
  BEGIN,
    BEGIN,
    0 +SCAN.ARRAY A0 PBMOVE,
    A0 () A2 LONG MOVE,                \ a2 is scan.array
    A2 A4 LONG MOVE,                 \ a4 is scan.array also
    0 +SCANINDEX A0 PBMOVE,              \ a0 is scan.index
    D7 D6 LONG MOVE,                 \ d6 is y
    D6 SCAN.RECORD# 1- LONG ANDI,                 \ low level bounds
    D6 2 # LONG ASL,                 \ d6 is y *2
    D6 0 WORD A0 @I) D5 LONG MOVE,           \ d5 is y index,
    D5 EDGE.COUNT LONG A2 @I) D0 LONG MOVE,      \ d0 is edge count
    D0 edge.record 2*  LONG SUBI, GE WHILE,             \ subtract two scans
      D0 D5 EDGE.COUNT LONG A2 @I) LONG MOVE,
      D0 A4 LONG ADDA,
      D5 X.START.SCAN LONG A4 @I) D1 LONG MOVE,     \ d1 is startx
      D5 Z.SCALE.BASE LONG A4 @I) D4 LONG MOVE,     \ d2 is temp zscale.base
      D5 X.END.SCAN   LONG A4 @I) D3 LONG MOVE,     \ d3 is endx
      D1 D3 LONG SUB,                 \ d3 is xdiff
      D1 2 # LONG ASL,
      D1 0 WORD A0 @I) D0 LONG MOVE,          \ d0 is x index
      D0 X.BYTE LONG A2 @I) D6 WORD MOVE,
      D6 LONG EXT,                  \ d6 is x start byte
      D5 Y.ADDRESS LONG A2 @I) D6 LONG ADD,       \ d6 is start adress of scan
      D0 X.BIT LONG A2 @I) D2 WORD MOVE,       \ d2 is x bit
        D5 Z.ADDRESS LONG A2 @I)  A1 LONG MOVE,     \ a1 is zbuffer for scanline
      D1 2 # LONG ASR,
      D1 Z.SHIFT # LONG ASL,               \ scale by z.record
      D1 A1 LONG ADDA,                 \ a1 is zbuffer start
      0 +THEBUFFER A6 I) D0 LONG MOVE,        \ check for buffer use
      D0 Z.SHIFT LONG ANDI,
      D0 A1 LONG ADDA,
      0 +ZXDIFF A6 I) D5 LONG MOVE,           \ d5 is zxdiff
      0 +OBJECTID A6 I) D1 LONG MOVE,         \ d1 is objectid
      0 +PAT A6 I) A2 LONG MOVE,           \ a2 is pattern handle
      D6 A0 LONG MOVE,                 \ a0 is start screen address
      D7 D0 WORD MOVE,                 \ a2 is current y
      D0 07 WORD ANDI,                 \ a2 is mod 7
      D0 0 WORD A2 @I) D6 BYTE MOVE,
      AWIPE.LINE                    \ wipe the scan section
    REPEAT,
    D7 01 LONG ADDQ,                   \ increment scanline
    SP () D7 LONG CMP,
  GT UNTIL, 2DROP,
  R>, RTS, END-CODE

  PROC.END


 PROC.START

 CODE (H.POLYSCAN)   ( STARTY ENDY -- )
```

```
>R,
   2 SP@, D7 LONG MOVE,
D7 01 LONG ADDQ,                   \ first line free for backscan
BEGIN,
  BEGIN,
  0 +SCAN.ARRAY A0 PBMOVE,
  A0 () A2 LONG MOVE,               \ a2 is scan.array
  A2 A4 LONG MOVE,                 \ a4 is scan.array also
  0 +SCANINDEX A0 PBMOVE,             \ a0 is scan.index
  D7 D6 LONG MOVE,                 \ d6 is y
  D6 SCAN.RECORD# 1- LONG ANDI,                 \ low level bounds
  D6 2 # LONG ASL,                 \ d6 is y *2
  D6 0 WORD A0 @I) D5 LONG MOVE,          \ d5 is y index,
  D5 EDGE.COUNT LONG A2 @I) D0 LONG MOVE,      \ d0 is edge count
  D0 edge.record 2*  LONG SUBI, GE WHILE,            \ subtract two scans
    D0 D5 EDGE.COUNT LONG A2 @I) LONG MOVE,
    D0 A4 LONG ADDA,
    D5 X.START.SCAN LONG A4 @I) D1 LONG MOVE,     \ d1 is startx
    D5 Z.SCALE.BASE LONG A4 @I) D4 LONG MOVE,     \ d2 is temp zscale.base
    D5 X.END.SCAN   LONG A4 @I) D3 LONG MOVE,     \ d3 is endx
    D1 D3 LONG SUB,                \ d3 is xdiff
    D1 2 # LONG ASL,
    D1 0 WORD A0 @I) D0 LONG MOVE,          \ d0 is x index
    D0 X.BYTE LONG A2 @I) D6 WORD MOVE,
    D6 LONG EXT,                 \ d6 is x start byte
    D5 Y.ADDRESS LONG A2 @I) D6 LONG ADD,       \ d6 is start adress of scan
    D0 X.BIT LONG A2 @I) D2 WORD MOVE,        \ d2 is x bit
      D5 Z.ADDRESS LONG A2 @I)  A1 LONG MOVE,     \ a1 is zbuffer for scanline
    D1 2 # LONG ASR,
    D1 Z.SHIFT # LONG ASL,             \ scale by z.record
    D1 A1 LONG ADDA,               \ a1 is zbuffer start
    0 +THEBUFFER A6 I) D0 LONG MOVE,        \ check for buffer use
    D0 Z.SHIFT LONG ANDI,
    D0 A1 LONG ADDA,
    0 +ZXDIFF   A6 I) D5 LONG MOVE,        \ d5 is zxdiff
    0 +OBJECTID  A6 I) D1 LONG MOVE,        \ d1 is objectid
    0 +PAT A6 I) A2 LONG MOVE,           \ a2 is pattern handle
    D6 A0 LONG MOVE,               \ a0 is start screen address
    D7 D0 WORD MOVE,               \ a2 is current y
    D0 07 WORD ANDI,               \ a2 is mod 7
    D0 0 WORD A2 @I) D6 BYTE MOVE,
    HWIPE.LINE                   \ wipe the scan section
  REPEAT,
  D7 01 LONG ADDQ,                \ increment scanline
  SP () D7 LONG CMP,
GT UNTIL, 2DROP,
R>, RTS,
NEXT END-CODE

 PROC.END
```

6/1/90 20:48 BYTE Z.CONSTANTS Page 1

```
\ zbuffer constants     \ set to byte length zbuffer and object buffer

cr ." Loading BYTE Zbuffer constants..."

\ these constants configure the zbufer for byte depth


    2   CONSTANT Z.RECORD       \ record length in bytes
    1   CONSTANT Z.SHIFT      \ shift mult for record size
    8     CONSTANT Z.REC.SHIFT    \ # of bits in half record
    120   CONSTANT Z.BOUNDS       \ bounds for clipping

HEX
    FF      CONSTANT Z.MASK
      7F    CONSTANT ZERASE       \ default fill for zbuff
      7F007F00  CONSTANT BOTHERASE      \ default fill for long
    100 CONSTANT 2Z.SIZE.RANGE
DECIMAL


: Z.SIZE, ASSEMBLER  BYTE ;         \ assembler length for zbuff
: 2Z.SIZE, ASSEMBLER  WORD ;        \ assembler length for record
: Z.EXT, ASSEMBLER
  LOCALS| R1 R2 |
  R2 R1 WORD EXT,
  R2 R1 LONG EXT,  ;

: Z@ C@ ;
: Z! C@ ;

   255 CONSTANT LAST.OBJECT
```

```
\ Revision 2:  June 13, 1987 at 2300 pst:  Add skeleton for "complete" glue
\ Revision 1:  June  9, 1987 at 1100 pst:  Fix GetTrapAddress usage

anew TestEnvirons

\ Note:  To test the 64K ROM path, define the following:
\ false constant ?128K.rom

structure SysEnvRec
  short:  seEnvironsVersion   \ 1 for this format
  short:  seMachineType      \ -1 = Mac (64K ROM)
                 \ -2 = MacXL
                 \ 0  = newer than Mac II
                 \ 1  = Mac 512 Enhanced
                 \ 2  = Mac Plus
                 \ 3  = Mac SE
                 \ 4  = Mac II
  short:  seSystemVersion     \ x.y where x in high byte, y in low byte
  short:  seProcessor        \ 0 = unknown (newer than 68020)
                 \ 1 = 68000
                 \ 2 = 68010
                 \ 3 = 68020
  byte: seHasFPU         \ TRUE if Motorola MC68881 installed
  byte: seHasColorQD      \ TRUE if Color QD available.  Ask
                 \ QuickDraw about screen(s) available.
  short:  seKeyboardType      \ 0 = unknown (MacXL OR MacPlus w/keypad
                 \ 1 = original Mac
                 \ 2 = original Mac plus keypad
                 \ 3 = Mac Plus
  \ Using ADB, this is type   \ 4 = Apple Extended
  \   of LAST keyboard struck   \ 5 = Apple Standard (ADB)
  short:  seATDrvrVersNum     \ version of AppleTalk if loaded
  short:  seSysVRefNum      \ WDRefNum or VRefNum of open sys file
  structure.end

'global EnvironsVersion  1 to EnvironsVersion

 hex
 create _GetTrapAddress,NEWTOOL  -4 allot
   popd0,
   A746 w,
   pusha0,
   next,

 create _GetTrapAddress,NEWOS  -4 allot
   popd0,
   A346 w,
   pusha0,
   next,

 op16 extD0.L, 48C0 w,   \ Sign-extend reg D0 to a Long

 create SysEnvirons  -4 allot  ( version\addr -- result )
   popA0, popD0,
   A090 w,     \ SysEnvirons trap
   extD0.L, pushD0,
   next,

 hex
 : 512EorPlus  ( -- n | n = 1 for Mac 512E, 2 for Mac Plus )
 \ NOTE:  This test needs to be improved.
   108 @ 100000 < if ( less than 1 MEG memory )
     1   \ Assume 512E.  Never a MacPlus if we return this.
```

```
    else
    2   \ Assume Mac +.  Does not consider memory upgrades on 512E
    then ;

: DetermineMacType  ( -- n | Return code for machine type )
  400008 <w@ case       \ ROM identification
    69 of -1  endof \ 128K Mac or 512K Mac, 64K ROM
    70 of -2  endof \
    80 of -2  endof \ Mac XL (LISA)
    81 of -2  endof \
    75 of 512EorPlus endof \ Need to know how to test this
      0 swap
    endcase ;  \ NOTE: Mac II and Mac SE always have the new trap, never
         \      come here.

: DetermineProcessor  ( -- n | Return code for processor type running )
  99 ;  \ NOTE: I need help with this one.

: DetermineFPU  ( -- n | Return 1 if FPU installed.  Would be a )
        (        3rd-party installation. )
  0 ;  \ NOTE: I need help with this one.  JJ?

: DetermineKbd  ( -- n | Return code for keyboard )
  99 ;  \ NOTE: There's an undocumented lowmemory global with this
     \       information.  I've lost its address and its coding.  HELP.
     \       NOT the IM V stuff...if that's present, so's the trap.

: DetermineATVers ( -- n | Return AppleTalk version number if loaded )
  0 ;  \ NOTE: I have no idea how.

: DetermineSysVRef ( -- n | Return volref# of system.  To be done. )
  0 ;  \ Will use code from TN 77, I guess.

: MyEnvirons  ( addr -- result | TEMPORARY )
  locals| theWorld |
  theWorld SysEnvRec erase
  1 theWorld seEnvironsVersion w!
  DetermineMacType theWorld seMachineType w!
( NOTE: The Apple supplied glue always returns 0 for System Version,
        so this glue will, also. )
  DetermineProcessor theWorld seProcessor w!
  DetermineFPU      theWorld seHasFPU c!
  \ NOTE: If no new trap, then no Color Quick Draw.  Already 0.
  DetermineKbd      theWorld seKeyboardType w!
  DetermineATVers     theWorld seATDrvrVersNum w!
  DetermineSysVRef    theWorld seSysVRefNum w!
\ NOTE:  Must fill in other fields as well as possible here
  [ decimal ] -5500 ( return no-trap result code ) ;

hex

: SystemEnvirons  ( addr -- result | Addr of a SysEnvRec structure )
\ Acts according to TN 129, except glue does not attempt to fill in
\   AppleTalk version.
  locals| theWorld |
  ?128K.rom if
    9F _GetTrapAddress,NEWTOOL    \ Unimplemented trap
    90 _GetTrapAddress,NEWOS     \ SysEnvirons trap
    = not if
      EnvironsVersion theWorld SysEnvirons
      theWorld seHasColorQD C@ IF
        9F _GetTrapAddress,NEWTOOL
        AB1D _GetTrapAddress,NEWTOOL = NOT if
          theWorld seHasColorQD C@ 1+
```

```
          theWorld seHasColorQD C!
        then
      then
      else
      theWorld MyEnvirons
      then
    else
    theWorld MyEnvirons
    then ;
decimal

create ThisSystem SysEnvRec allot


: TestEnvironment  ( --- | Check environment for this version )
  ThisSystem SysEnvRec 255 fill
  ThisSystem SystemEnvirons drop
  ThisSystem seMachineType <w@ case
    -1 of  " Swivel will not run on a 64k ROM Mac..."
         "" "" "" 401 IssueAlert drop bye  endof
    -2 of " Swivel will not run on a Lisa..."
         "" "" "" 401 IssueAlert drop bye  endof
     1 of  " Swivel needs at least 1 meg of memory to run "
         "" "" "" 401 IssueAlert drop bye  endof
   endcase
  ThisSystem seSystemVersion c@ 6 < if
    " You are using old system software"
    " Use system 6.2 or newer..." "" "" 401 IssueAlert drop bye
  then
  ThisSystem seProcessor <w@
    1 =  6800? not and if
      " This version of Swivel requires a 68020+ environment  "
      "" "" "" 401 IssueAlert drop bye
    then
  ;
```

```
\ clear zbuffer routines

anew zbuffer.clear.routines

cr ." Loading Zbuffer Clear Routines ... "


   CODE CLEAR.ZBUFF              \ fills object buffer with world object id
     ZBUFFER A0 )#MOVE,
     A0 () A1 LONG MOVE,
      ZBUFFERX A0 )#MOVE,
   A0 ()  D1 LONG MOVE,
    ZBUFFERY ZBUFFERX - A0 I) D0 LONG MOVE,
   D0 D1 MULS,
   D1 3 # LONG ASR,
   D1 1 LONG SUBQ,
     HEX ZERASE  # D0 LONG MOVE, DECIMAL
     BEGIN,
        D0 A1 () Z.SIZE, MOVE,
        D0 Z.RECORD A1 I) Z.SIZE, MOVE,
        D0 Z.RECORD 2* A1 I) Z.SIZE, MOVE,
        D0 Z.RECORD 3 * A1 I) Z.SIZE, MOVE,
        D0 Z.RECORD 4 * A1 I) Z.SIZE, MOVE,
        D0 Z.RECORD 5 * A1 I) Z.SIZE, MOVE,
        D0 Z.RECORD 6 * A1 I) Z.SIZE, MOVE,
        D0 Z.RECORD 7 * A1 I) Z.SIZE, MOVE,
      Z.RECORD 8* # A1 LONG ADDA,
     D1  LOOP,
     NEXT END-CODE


   CODE CLEAR.WOBUFFER            \ fills object buffer with world object id
     OBUFFER A0 )#MOVE,
     A0 () A1 LONG MOVE,
      ZBUFFERX A0 )#MOVE,
   A0 ()  D1 LONG MOVE,
   ZBUFFERY ZBUFFERX - A0 I) D0 LONG MOVE,
   D0 D1 MULS,
   D1 3  # LONG ASR,
   D1 1 LONG SUBQ,
     HEX ZERASE # D0 LONG MOVE, DECIMAL
     BEGIN,
        D0 A1 () Z.SIZE, MOVE,
        D0 Z.RECORD A1 I) Z.SIZE, MOVE,
        D0 Z.RECORD 2* A1 I) Z.SIZE, MOVE,
        D0 Z.RECORD 3 * A1 I) Z.SIZE, MOVE,
        D0 Z.RECORD 4 * A1 I) Z.SIZE, MOVE,
        D0 Z.RECORD 5 * A1 I) Z.SIZE, MOVE,
        D0 Z.RECORD 6 * A1 I) Z.SIZE, MOVE,
        D0 Z.RECORD 7 * A1 I) Z.SIZE, MOVE,
      Z.RECORD 8* # A1 LONG ADDA,
     D1  LOOP,
     NEXT END-CODE


   CODE CLEAR.OBUFF              \ fills object buffer with world object id
      OBUFFER A0 )#MOVE,
      A0 () A1 LONG MOVE,
       ZBUFFERX A0 )#MOVE,
    A0 ()  D1 LONG MOVE,
    ZBUFFERY ZBUFFERX - A0 I) D0 LONG MOVE,
    D0 D1 MULS,
    D1 3  # LONG ASR,
```

```
D1 1 LONG SUBQ,
  0  D0 MOVEQ,                    \ zero stands for world
  BEGIN,
     D0 A1 () Z.SIZE, MOVE,          \  writes into 8 alternate bytes
     D0 Z.RECORD A1 I) Z.SIZE, MOVE,       \  writes into 8 alternate bytes
     D0 Z.RECORD 2 * A1 I) Z.SIZE, MOVE,      \  writes into 8 alternate bytes
     D0 Z.RECORD 3 * A1 I) Z.SIZE, MOVE,      \  writes into 8 alternate bytes
     D0 Z.RECORD 4 * A1 I) Z.SIZE, MOVE,      \  writes into 8 alternate bytes
     D0 Z.RECORD 5 * A1 I) Z.SIZE, MOVE,      \  writes into 8 alternate bytes
     D0 Z.RECORD 6 * A1 I) Z.SIZE, MOVE,      \  writes into 8 alternate bytes
     D0 Z.RECORD 7 * A1 I) Z.SIZE, MOVE,      \  writes into 8 alternate bytes
   Z.RECORD 8* # A1 LONG ADDA,
  D1  LOOP,
  NEXT END-CODE


 CODE CLEAR.BOTH                 \ fills object and zbuffers with default values
SAVE.REGS                    \ save registers
  ZBUFFER A0 )#MOVE,               \ fetch handle  to zbuffer
  A0 () A1 LONG MOVE,              \ a1 is pointer to zbuffer
  ZBUFFERX A0 )#MOVE,
A0 ()  D0 LONG MOVE,
ZBUFFERY ZBUFFERX - A0 I) D1 LONG MOVE,
D1 D0  MULS,
D0 Z.SHIFT # LONG ASL,
D0  A1 LONG ADDA,                \ a1 is end address in zbuffer
D0  7 # LONG ASR,                \ d1 is zbuffer length / 128
D0  1 LONG SUBQ,
  HEX BOTHERASE # D1 LONG MOVE, DECIMAL       \ load default buffer values
D1 A0 LONG MOVE,                 \ put same value into all data regs
D1 D2 LONG MOVE,
D1 D3 LONG MOVE,
D1 D4 LONG MOVE,
  D1 D5 LONG MOVE,
D1 D6 LONG MOVE,
D1 D7 LONG MOVE,
  BEGIN,
   REGLIST D1-D7/A0 A1 -) LONG MOVEM,       \ fill 32 bytes of zbuffer
 REGLIST D1-D7/A0 A1 -) LONG MOVEM,
 REGLIST D1-D7/A0 A1 -) LONG MOVEM,
 REGLIST D1-D7/A0 A1 -) LONG MOVEM,       \ 32 * 4 bytes = 128 bytes filled
  D0  LOOP,                      \ loop zbuffer.length / 128
RESTORE.REGS
  NEXT END-CODE
```

```
HEX
  A9B0 MT WRITE.RESOURCE
DECIMAL

: MAKE.CODE.SEGMENT
  0 LOCALS| MY.SEG SegName SegID START.CODE END.CODE |
  ASCII CODE
  SEGID GET.RESOURCE TO MY.SEG
  MY.SEG IF
    MY.SEG REMOVE.RESOURCE
    MY.SEG TO.HEAP
  THEN
  END.CODE START.CODE - FROM.HEAP TO MY.SEG
  START.CODE MY.SEG @ END.CODE START.CODE - CMOVE
  MY.SEG
  ASCII CODE
  SegID
  SegName
  ADD.RESOURCE
  MY.SEG WRITE.RESOURCE
  MY.SEG DETACH.RESOURCE
  MY.SEG TO.HEAP
  UPDATE.RESOURCES ;
```

```
\ Color Picker Package

\  Production Release.  10-17-87

\ Copyright 1986, by Creative Solutions, Inc.
\ All Rights Reserved.

\ Derived from MPW picker.a
\ Copyright Apple Computer, Inc.  1986-1987
\ All Rights Reserved

\ Permission is hereby granted to registered MacForth customers to use
\ this source code in their own applications, provided that the author
\ acknowledges Creative Solutions' contribution within the application's
\ documentation, and /or  "credit screen".  Distribution of this source
\ code to any third party or other use is prohibited.
\
\ This file contains the interface words to the Macintosh 2 color
\   picker package. See example below for sample usage. Refer to Inside
\ Macinbtosh Vol 5 Chapter 8 for more details

cr ." Loading Color Picker..."

hex

<code Pack12 ( ???\selector -- ??? )   \ Adjust selector to Word, call pack 12
     dropw,     ( selector is a word )
     a82e w,    ( pack 12)   next,  decimal

decimal

: ColorPicker  ( location\prompt$\incolor\outcolor -- flag )
  \ location is address of a point. Point specifies upper left corner
  \ of picker window If 0 is passed for location, an appropriate location
  \   is computed and used
  \ Prompt string is pascal type text string (byte count preceedes bytes)
  \ inColor is address of 6 byte RGB supplied value
  \ OutColor is address of 6 byte RGB resulting value
  \ Flag is true if user exits via OK Button, otherwise false on cancel
  4 needed  0 4 bury   9 Pack12  boolean  ;



: RGB  ( red\green\blue  --  )   \ creates an RGB color array
    Create rot w, swap w, w,  ;

: @RGB  ( addr -- red\green\blue -- )
    dup dup w@ swap 2+ w@ rot 4+ w@  ;

: !RGB  ( red\green\blue\addr -- )
    dup>r 4+ w! r@ 2+ w! r> w!  ;

HEX
CREATE RGB.LT.GREY  9000 W, 9000 W, 9000 W,
DECIMAL
```

```
\ Color Management for the swiv

cr ." Loading Color Utilities..."


  0 CONSTANT ^SET.OBJECT.COLOR.INDEX
  0  constant ^SET.DEFAULT.COLOR


  : SET.OBJECT.COLOR.INDEX
    ^SET.OBJECT.COLOR.INDEX EXECUTE ;

  : SET.DEFAULT.COLOR
      ^SET.DEFAULT.COLOR EXECUTE ;


create incolor   0 , 0 ,
create outcolor  0 , 0 ,

create prompt  ," Select object color..."



  : SELECT.COLOR
    POLY.DEPTH @ 8 = IF
      INIT.CURSOR                   \ ARROW FOR PICKING
      OBJECT.RGBCOLOR DROP @RGB
      INCOLOR !RGB
      0 PROMPT INCOLOR OUTCOLOR COLORPICKER     \ PICKER
    IF
        OUTCOLOR @RGB
      OBJECT.RGBCOLOR DROP !RGB
        SET.OBJECT.COLOR.INDEX
    THEN
    THEN ;
```

```
\ color poly extensions for the convex poly algorithm in poly draw
\ because the two data forms are the same, zbuffer and pixmap, this routine
\ is probably a little faster than the black and white routines
\ Last Revision: 09/10/87  06:52:38 PM   YH

anew color.poly.extensions

cr
." Loading Color Poly Extensions... "

HEX
  10000 CONSTANT XBUMP
DECIMAL


 PROC.START

CODE (TPOLYSCAN)   ( STARTY ENDY -- )            \ draws a complex color scanline
  >R,
    2 SP@, D7 LONG MOVE,
  D7 01 LONG ADDQ,                    \ first line free for backscan
  BEGIN,
    BEGIN,
    0 +SCAN.ARRAY  a6 I) A2 LONG MOVE,          \ a2 is scan.array
    A2 A4 LONG MOVE,                  \ a4 is scan.array also
    0 +SCANINDEX A0 PBMOVE,                \ a0 is scan.index
    D7 D6 LONG MOVE,                  \ d6 is y
    D6 SCAN.RECORD# 1- LONG ANDI,            \ low level bounds
    D6 2 # LONG ASL,                  \ d6 is y *2
    D6 0 WORD A0 @I) D5 LONG MOVE,           \ d5 is y index,
    D5 EDGE.COUNT LONG A2 @I) D0 LONG MOVE,       \ d0 is edge count
    D0 edge.record 2*  LONG SUBI, GE WHILE,      \ subtract two scans
      D0 D5 EDGE.COUNT LONG A2 @I) LONG MOVE,
      D0 A4 LONG ADDA,
      D5 X.START.SCAN LONG A4 @I) D1 LONG MOVE,     \ d1 is startx
      D5 Z.SCALE.BASE LONG A4 @I) D4 LONG MOVE,     \ d2 is temp zscale.base
      D5 X.END.SCAN   LONG A4 @I) D3 LONG MOVE,     \ d3 is endx
      D1 D3 LONG SUB,                \ d3 is xdiff
      D1 2 # LONG ASL,
      D1 0 WORD A0 @I) D0 LONG MOVE,          \ d0 is x index
      D0 X.BYTE LONG A2 @I) D6 WORD MOVE,
      D6 LONG EXT,                 \ d6 is x start byte
      D5 Y.ADDRESS LONG A2 @I) D6 LONG ADD,       \ d6 is start adress of scan
      D5 Z.ADDRESS LONG A2 @I)  A1 LONG MOVE,     \ a1 is zbuffer for scanline
      D1 2 # LONG ASR,
      D1 Z.SHIFT # LONG ASL,             \ shift * z.record
      D1 A1 LONG ADDA,               \ a1 is zbuffer start
      0 +THEBUFFER A6 I) D0 LONG MOVE,        \ check for buffer use
      D0 Z.SHIFT LONG ANDI,
      D0 A1 LONG ADDA,
      A0 A2 LONG MOVE,
      0 +ZXDIFF A6 I) D5 LONG MOVE,          \ d5 is zxdiff
      0 +OBJECTID  A6 I) D1 LONG MOVE,        \ d1 is objectid
      D6 A0 LONG MOVE,
      0 +PAT#   A6 I) D6 LONG MOVE,          \ d6 is absolute pixel color
      8WIPE.LINE
    REPEAT,
    D7 01 LONG ADDQ,                  \ increment scanline
    SP () D7 LONG CMP,
  GT UNTIL, 2DROP,
  R>, RTS,  END-CODE
```

```
PROC.END


PROC.START

CODE (8WHITESCAN)   ( STARTY ENDY -- )
  >R,
    2 SP@, D7 LONG MOVE,
  D7 01 LONG ADDQ,                 \ first line free for backscan
  BEGIN,
    BEGIN,
    0 +SCAN.ARRAY A6 I) A2 LONG MOVE,          \ a2 is scan.array
    A2 A4 LONG MOVE,                  \ a4 is scan.array also
    0 +SCANINDEX A0 PBMOVE,               \ a0 is scan.index
    D7 D6 LONG MOVE,                  \ d6 is y
    D6 SCAN.RECORD# 1- LONG ANDI,             \ low level bounds
    D6 2 # LONG ASL,                  \ d6 is y *2
    D6 0 WORD A0 @I) D5 LONG MOVE,            \ d5 is y index,
    D5 EDGE.COUNT LONG A2 @I) D0 LONG MOVE,       \ d0 is edge count
    D0 edge.record 2*  LONG SUBI, GE WHILE,             \ subtract two scans
      D0 D5 EDGE.COUNT LONG A2 @I) LONG MOVE,
      D0 A4 LONG ADDA,
      D5 X.START.SCAN LONG A4 @I) D1 LONG MOVE,     \ d1 is startx
      D5 Z.SCALE.BASE LONG A4 @I) D4 LONG MOVE,     \ d2 is temp zscale.base
      D5 X.END.SCAN   LONG A4 @I) D3 LONG MOVE,     \ d3 is endx
      D1 D3 LONG SUB,                 \ d3 is xdiff
      D1 2 # LONG ASL,
      D1 0 WORD A0 @I) D0 LONG MOVE,          \ d0 is x index
      D0 X.BYTE LONG A2 @I) D6 WORD MOVE,
      D6 LONG EXT,                  \ d6 is x start byte
      D5 Y.ADDRESS LONG A2 @I) D6 LONG ADD,       \ d6 is start adress of scan
      D5 Z.ADDRESS LONG A2 @I)  A1 LONG MOVE,     \ a1 is zbuffer for scanline
      D1 2 # LONG ASR,
      D1 Z.SHIFT # LONG ASL,              \ shift * z.record
      D1 A1 LONG ADDA,                \ a1 is zbuffer start
      0 +THEBUFFER A6 I) D0 LONG MOVE,        \ check for buffer use
      D0 Z.SHIFT LONG ANDI,
      D0 A1 LONG ADDA,
      A0 A2 LONG MOVE,
      0 +ZXDIFF A6 I) D5 LONG MOVE,           \ d5 is zxdiff
      0 +OBJECTID  A6 I) D1 LONG MOVE,        \ d1 is objectid
      D6 A0 LONG MOVE,
      WHITE.8LINE
    REPEAT,
    D7 01 LONG ADDQ,                  \ increment scanline
    SP () D7 LONG CMP,
  GT UNTIL, 2DROP,
  R>,  RTS, END-CODE

  PROC.END


  PROC.START

 CODE 8JUST.LINE.VARS    ASSEMBLER       \  d7 is y --
  >R,
  BEGIN,
  D7 01 LONG ADDQ,                \ increment scanline
```

```
0 +SCAN.ARRAY A6 I) A2 LONG MOVE,         \ a2 is scan.array
0 +SCANINDEX A0 PBMove,            \ A0 IS SCAN.INDEX
D7 D6 LONG MOVE,              \ D6 is Y
D6 SCAN.RECORD# 1- LONG ANDI,                  \ low level bounds
D6 2 # LONG ASL,              \ D6 IS Y *2
D6 0 WORD A0 @I) D5 LONG MOVE,          \ D5 IS Y INDEX,
D5 X.LINE LONG A2 @I) D1 LONG MOVE,       \ D1 IS THISX
D5 D0 LONG MOVE,
D0 SCAN.RECORD.LENGTH LONG SUBI,
D0 X.LINE LONG A2 @I) D3 LONG MOVE,       \ D3 IS LASTX
 D1 D3 LONG CMP,              \ TEST WHICH IS FIRST
 PL IF,
  D5 Z.LINE LONG A2 @I) D4 LONG MOVE,     \ D4 IS ZSCALE.BASE
 ELSE,
  D1 D3 EXG,
  D5 D0 LONG MOVE,
  D0 SCAN.RECORD.LENGTH LONG SUBI,
  D0 Z.LINE LONG A2 @I) D4 LONG MOVE,     \ D4 IS LAST ZSCALE.BASE
    0 +ZYDIFF A6 I) D2 LONG MOVE,         \ D5 IS ZYDIFF
    D2 D4 LONG ADD,              \ ADD FOR NEW ZBASE
 THEN,
D4 XBUMP NEG LONG ADDI,
D1 D3 LONG SUB,               \ D3 IS XDIFF
D1 2 # LONG ASL,
D1 0 WORD A0 @I) D0 LONG MOVE,          \ D0 IS X INDEX
D0 X.BYTE LONG A2 @I) D6 WORD MOVE,
D6 LONG EXT,                 \ D6 IS X START BYTE
D5 Y.ADDRESS LONG A2 @I) D6 LONG ADD,       \ D6 IS START ADDRESS OF SCAN
D0 X.BIT LONG A2 @I) D2 WORD MOVE,        \ D2 IS X BIT
D5 Z.ADDRESS LONG A2 @I)  A1 LONG MOVE,     \ A1 IS ZBUFFER FOR SCANLINE
D1 2 # LONG ASR,
D1 Z.SHIFT # LONG ASL,               \ scale by z.record
D1 A1 LONG ADDA,              \ A1 IS ZBUFFER START
0 +THEBUFFER A6 I) D0 LONG MOVE,         \ CHECK FOR BUFFER USE
D0 Z.SHIFT LONG ANDI,
D0 A1 LONG ADDA,
A0 A2 LONG MOVE,
0 +ZXDIFF A6 I) D5 LONG MOVE,           \ D0 IS ZXDIFF                \ D5 IS ZXDIFF
0 +OBJECTID  A6 I) D1 LONG MOVE,        \ D1 IS OBJECTID
D6 A0 LONG MOVE,              \ A0 IS START SCREEN ADDRESS          \ D1 IS CURRENT OBJECT
0 +LINEPAT A6 I) D6 LONG MOVE,
JUST8.LINE
SP () D7 LONG CMP,
GE UNTIL,
R>, RTS, END-CODE

PROC.END



PROC.START

CODE 8HORIZ.LINE.VARS     ASSEMBLER       \  d7 is y --
  >R,
  0 +SCAN.ARRAY A6 I) A2 LONG MOVE,         \ a2 is scan.array
  0 +SCANINDEX A0 PBMove,            \ a0 is scan.index
  D7 D6 LONG MOVE,              \ d6 is y
  D6 SCAN.RECORD# 1- LONG ANDI,                  \ low level bounds
  D6 2 # LONG ASL,              \ d6 is y *4
  D6 0 WORD A0 @I) D5 LONG MOVE,          \ d5 is y index,
  0 +TEMPPOINT1  8 + A6 I) D1 LONG MOVE,
  0 +TEMPPOINT2  8 + A6 I) D3 LONG MOVE,
  D1 D3 LONG CMP,               \ test which is first
```

```
  PL IF,
   0 +TEMPPOINT1 A6 I) D4 LONG MOVE,
  ELSE,
   D1 D3 EXG,
   0 +TEMPPOINT2 A6 I) D4 LONG MOVE,       \ add for new zbase
  THEN,
 D4 SWAP,
 0 # D4 WORD MOVE,                \ clear bottom word of zbase
 D1 D3 LONG SUB,               \ d3 is xdiff
 D1 2 # LONG ASL,
 D1 0 WORD A0 @I) D0 LONG MOVE,          \ d0 is x index
 D0 X.BYTE LONG A2 @I) D6 WORD MOVE,
 D6 LONG EXT,                  \ d6 is x start byte
 D5 Y.ADDRESS LONG A2 @I) D6 LONG ADD,       \ d6 is start address of scan
 D0 X.BIT LONG A2 @I) D2 WORD MOVE,        \ d2 is x bit
 D5 Z.ADDRESS LONG A2 @I)  A1 LONG MOVE,     \ a1 is zbuffer for scanline
 D1 2 # LONG ASR,
 D1 Z.SHIFT # LONG ASL,             \ scale by z.record
 D1 A1 LONG ADDA,               \ a1 is zbuffer start
 0 +SCANINDEX  A6 I) D0 LONG MOVE,         \ check for buffer use
 D0 Z.SHIFT LONG ANDI,
 D0 A1 LONG ADDA,
 A0 A2 LONG MOVE,
 0 +ZXDIFF A6 I) D5 LONG MOVE,           \ d5 is zxdiff
 0 +OBJECTID  A6 I) D1 LONG MOVE,        \ d1 is objectid
 D6 A0 LONG MOVE,               \ a0 is start screen address, d1 is current object
 0 +LINEPAT  A6 I) D6 LONG MOVE,
 JUST8.LINE
 R>, RTS, END-CODE

 PROC.END


 PROC.START

CODE (8WIRESCAN)    ( STARTY ENDY -- )
 >R,
 XSAVE.REGS
  2 SP@, D7 LONG MOVE,
  D7 1 LONG ADDQ,
  D0 POP,
  D0 1 LONG ADDQ,
  D0 PUSH,
  D0 D7 LONG CMP,
  MI IF,
    ' 8JUST.LINE.VARS 4- BSR,
  ELSE,
    ' 8HORIZ.LINE.VARS 4- BSR,
   THEN, 2DROP,
 XRESTORE.REGS
 R>,
 rts, END-CODE

 PROC.END


PROC.START

CODE 8WIRESCAN,           \ small.y big.y -- draws the line between this scan range
 >R,
 D1 POP,             \ d1 = big.y
 D0 POP,             \ d0 = small.y
 0 +ALIAS? A0 PBMove,        \ if aliasing is turned on then
```

```
 A0 () LONG TST, NE IF,       \ scale down by 2
   D0 2 # LONG ASR,
   D1 2 # LONG ASR,
 THEN,
 D0 D1 LONG CMP,          \ if small is bigger
 MI IF,             \ swap them
 D1 D0 EXG,
 THEN,
 D0 1 LONG CMPI, MI IF,       \ if small is less than 1, clip
   1 D0 MOVEQ,
 THEN,
 0 +POLYYMAX A0 PBMove,       \ A0 = max poly y bounds
 A0 () D0 LONG CMP, MI IF,      \ if within range...
   A0 () D1 LONG CMP, PL IF,    \ test large and clip range
     A0 () D1 LONG MOVE,
   THEN,
   D1 LONG TST, PL IF,       \ if large is within range...
     D0 PUSH,          \ push small
     D1 PUSH,          \ push large
     ' (8WIRESCAN) 4- BSR,    \ draw the line
   THEN,
 THEN,
 R>,  RTS,
 END-CODE

 PROC.END



 PROC.START

CODE (SCAN.ALL.8LINES)                  \ write scanarray for all lines
    >R,
    ' (CLEAR.LINE.SCAN) 4- BSR,           \ clear the line scan
    0 +POLYPOINTS# A0 PBMOVE,
    A0 () D1 LONG MOVE,
    D1 2 LONG SUBQ, PL IF,
      0 +POLYPOINTS A1 PBMove,
      BEGIN,
        D1 PUSH,                \ save the loop
        A1 PUSH,                \ save the pointer
        A1 PUSH,                \ args for edge scan
        12 # A1 LONG ADDA,            \ polypointer, and + 12
        A1 PUSH,
        0 +Alias? A0 PBMove,
        A0 () LONG TST,
        EQ IF,
          ' (SCAN.EDGE.IN)   4- BSR,   \ do the scan
        ELSE,
          ' (SCAN.ALIAS.EDGE.IN)  4- BSR,
        THEN,
        A1 GET,                 \ restore the pointer
        4 A1 I) PUSH,
        16 A1 I) PUSH,
        ' 8WIRESCAN, 4- BSR,
        A1 POP,
        D1 POP,                 \ restore the loop
        12 # A1 LONG ADDA,            \ inc the pointer
      D1 LOOP,
      A1 PUSH,
      A1 PUSH,
      0 +POLYPOINTS A1 PBMove,
      A1 PUSH,
      0 +Alias? A0 PBMove,
```

```
    A0 () LONG TST,
    EQ IF,
      ' (SCAN.EDGE.IN)     4- BSR,    \ do the scan
    ELSE,
      ' (SCAN.ALIAS.EDGE.IN)  4- BSR,
    THEN,
    A1 POP,
    4 A1 I) PUSH,
    0 +POLYPOINTS A1 PBMove,
    4 A1 I) PUSH,
    ' 8WIRESCAN, 4- BSR,
  THEN,
  R>, RTS, END-CODE

PROC.END
```

```
\ DRAW.POLY                                         072586 YH

." Loading 8 bit color poly library "
cr


PROC.START

CODE (DRAW.8POLY5                  \ color wireframe
  SAVE.POLY.REGS
    ' (TRANS.POINT) 4- BSR,
  ' (POLY.BOUNDS) 4- BSR,
  0 +POLYPOINTS# A6 I) D0 LONG MOVE,
  D0 3 LONG CMPI, PL IF,
    ' (TWO.VECTOR) 4- BSR,
    ' (CROSS.PRODUCT) 4- BSR,
    SP () D0 LONG MOVE,
    0 D1 MOVEQ,
    D0 LONG TST, PL IF,
      D1 1 LONG ADDQ,
    THEN,
    0 +CullBack? A6 I) D0 LONG MOVE,
    D0 LONG TST,
    NE IF,
       D1 1 LONG ADDQ,
    THEN,
    D1 LONG TST, NE IF,            \ add backplane cull check here
      ' (NORMALIZE,) 4- bsr,
      ' (SET.PLANE.DIF) 4- BSR,
      ' (SCAN.ALL.8LINES) 4- BSR,
    ELSE,
      DROP,  2DROP,
    THEN,
  THEN,
  RESTORE.POLY.REGS
  RTS, END-CODE

  PROC.END


0 ' (DRAW.8POLY5 4-  SET.JUMP.TOKEN



PROC.START

CODE (DRAW.8POLY3             \ color hidden wireframe
  SAVE.POLY.REGS
    ' (TRANS.POINT) 4- BSR,
  ' (POLY.BOUNDS) 4- BSR,
  0 +POLYPOINTS# A6 I) D0 LONG MOVE,
  D0 3 LONG CMPI, PL IF,
    ' (TWO.VECTOR) 4- BSR,
    ' (CROSS.PRODUCT) 4- BSR,
    SP () D0 LONG MOVE,
    0 D1 MOVEQ,
    D0 LONG TST, PL IF,
      D1 1 LONG ADDQ,
    THEN,
    0 +CullBack? A6 I) D0 LONG MOVE,
    D0 LONG TST,
    NE IF,
       D1 1 LONG ADDQ,
    THEN,
```

```
    D1 LONG TST, NE IF,
      ' (NORMALIZE,) 4- bsr,
      ' (SET.PLANE.DIF) 4- BSR,
      ' (SCAN.ALL.8LINES) 4- BSR,
      0 +YBASESCAN A6 I) PUSH,
      0 +YMAXSCAN A6 I) PUSH,
      ' (8WHITESCAN) 4- BSR,
    ELSE,
      DROP,  2DROP,
    THEN,
  THEN,
  RESTORE.POLY.REGS
  RTS, END-CODE

  PROC.END


1 ' (DRAW.8POLY3 4-  SET.JUMP.TOKEN


PROC.START

CODE (DRAW.8POLY4               \ color shaded poly with lines
  SAVE.POLY.REGS
    ' (TRANS.POINT) 4- BSR,
  ' (POLY.BOUNDS) 4- BSR,
  0 +POLYPOINTS# A6 I) D0 LONG MOVE,
  D0 3 LONG CMPI, PL IF,
    ' (TWO.VECTOR) 4- BSR,
    ' (CROSS.PRODUCT) 4- BSR,
    SP () D0 LONG MOVE,
    0 D1 MOVEQ,
    D0 LONG TST, PL IF,
      D1 1 LONG ADDQ,
    THEN,
    0 +CullBack? A6 I) D0 LONG MOVE,
    D0 LONG TST,
    NE IF,
       D1 1 LONG ADDQ,
    THEN,
    D1 LONG TST, NE IF,         \ add backplane cull check here
      ' (NORMALIZE,) 4- bsr,
      08 SP I)  SP -) LONG MOVE,
      08 SP I)  SP -) LONG MOVE,
      08 SP I)  SP -) LONG MOVE,
      ' (SET.PLANE.DIF) 4- BSR,
        ' (MAP.SHADE) 4- BSR,
      ' (SCAN.ALL.8LINES) 4- BSR,
      0 +YBASESCAN A6 I) PUSH,
      0 +YMAXSCAN A6 I) PUSH,
      ' (tPOLYSCAN) 4- BSR,
    ELSE,
      DROP,  2DROP,
    THEN,
  THEN,
  RESTORE.POLY.REGS
  RTS, END-CODE

  PROC.END

2 ' (DRAW.8POLY4 4-  SET.JUMP.TOKEN
```

```
PROC.START

CODE (DRAW.8POLY0                \ color shaded poly
  SAVE.POLY.REGS
    ' (TRANS.POINT) 4- BSR,
  ' (POLY.BOUNDS) 4- BSR,
  0 +POLYPOINTS# A6 I) D0 LONG MOVE,
  D0 3 LONG CMPI, PL IF,
    ' (TWO.VECTOR) 4- BSR,
    ' (CROSS.PRODUCT) 4- BSR,
    SP () D0 LONG MOVE,
    0 D1 MOVEQ,
    D0 LONG TST, PL IF,
      D1 1 LONG ADDQ,
    THEN,
    0 +CullBack? A6 I) D0 LONG MOVE,
    D0 LONG TST,
    NE IF,
       D1 1 LONG ADDQ,
    THEN,
    D1 LONG TST, NE IF,           \ add backplane cull check here
      ' (NORMALIZE,) 4- bsr,
      08 SP I)  SP -) LONG MOVE,
      08 SP I)  SP -) LONG MOVE,
      08 SP I)  SP -) LONG MOVE,
      ' (SET.PLANE.DIF) 4- BSR,
        ' (MAP.SHADE) 4- BSR,
      ' (SCAN.ALL.EDGES) 4- BSR,
      0 +YBASESCAN A6 I) PUSH,
      0 +YMAXSCAN A6 I) PUSH,
      ' (TPOLYSCAN) 4- BSR,
    ELSE,
      DROP,  2DROP,
    THEN,
  THEN,
  RESTORE.POLY.REGS
  RTS, END-CODE

  PROC.END


3 ' (DRAW.8POLY0 4-  SET.JUMP.TOKEN


PROC.START

CODE (DRAW.POLY2               \ writes just zbuffer and object buffer for hatching
  SAVE.POLY.REGS
    ' (TRANS.POINT) 4- BSR,
  ' (POLY.BOUNDS) 4- BSR,
  0 +POLYPOINTS# A6 I) D0 LONG MOVE,
  D0 3 LONG CMPI, PL IF,
    ' (TWO.VECTOR) 4- BSR,
    ' (CROSS.PRODUCT) 4- BSR,
    SP () D0 LONG MOVE,
    0 D1 MOVEQ,
    D0 LONG TST, PL IF,
      D1 1 LONG ADDQ,
    THEN,
    0 +CullBack? A6 I) D0 LONG MOVE,
    D0 LONG TST,
    NE IF,
       D1 1 LONG ADDQ,
```

```
  THEN,
  D1 LONG TST, NE IF,            \ add backplane cull check here
    ' (NORMALIZE,) 4- bsr,
    08 SP I)  SP -) LONG MOVE,
    08 SP I)  SP -) LONG MOVE,
    08 SP I)  SP -) LONG MOVE,
    ' (SET.PLANE.DIF) 4- BSR,
      ' (MAP.SHADE) 4- BSR,
    ' (SCAN.ALL.EDGES) 4- BSR,
    0 +YBASESCAN A6 I) PUSH,
    0 +YMAXSCAN A6 I) PUSH,
    ' (H.POLYSCAN) 4- BSR,
  ELSE,
    DROP,  2DROP,
  THEN,
 THEN,
 RESTORE.POLY.REGS
 RTS, END-CODE

 PROC.END


PROC.START

CODE (DRAW.POLY1                 \ writes just zbuffer for shadow
  SAVE.POLY.REGS
    ' (TRANS.POINT) 4- BSR,
  ' (POLY.BOUNDS) 4- BSR,
  0 +POLYPOINTS# A6 I) D0 LONG MOVE,
  D0 3 LONG CMPI, PL IF,
    ' (TWO.VECTOR) 4- BSR,
    ' (CROSS.PRODUCT) 4- BSR,
    SP () D0 LONG MOVE,
    0 D1 MOVEQ,
    D0 LONG TST, PL IF,
      D1 1 LONG ADDQ,
    THEN,
    0 +CullBack? A6 I) D0 LONG MOVE,
    D0 LONG TST,
    NE IF,
      D1 1 LONG ADDQ,
    THEN,
    D1 LONG TST, NE IF,            \ add backplane cull check here
      ' (NORMALIZE,) 4- bsr,
      08 SP I)  SP -) LONG MOVE,
      08 SP I)  SP -) LONG MOVE,
      08 SP I)  SP -) LONG MOVE,
      ' (SET.PLANE.DIF) 4- BSR,
        ' (MAP.SHADE) 4- BSR,
      ' (SCAN.ALL.EDGES) 4- BSR,
      0 +YBASESCAN A6 I) PUSH,
      0 +YMAXSCAN A6 I) PUSH,
      ' (A.POLYSCAN) 4- BSR,
    ELSE,
      DROP,  2DROP,
    THEN,
  THEN,
  RESTORE.POLY.REGS
  RTS, END-CODE

  PROC.END
```

```
5 ' (DRAW.POLY1 4-  SET.JUMP.TOKEN
6 ' (DRAW.POLY2 4-  SET.JUMP.TOKEN


PROC.START

CODE (DRAW.MAPPOLY1             \ color shaded poly
  SAVE.POLY.REGS
    ' (TRANS.POINT) 4- BSR,
   ' (POLY.BOUNDS) 4- BSR,
  0 +POLYPOINTS# A6 I) D0 LONG MOVE,
  D0 3 LONG CMPI, PL IF,
    ' TOVECI 4- BSR,            \ never complex poly
    ' (ZCross.Product) 4- BSR,
    D0 pop,
    0 D1 MOVEQ,
    D0 LONG TST, PL IF,
      D1 1 LONG ADDQ,
    THEN,
    0 +CullBack? A6 I) D0 LONG MOVE,
    D0 LONG TST,
    NE IF,
       D1 1 LONG ADDQ,
    THEN,
    D1 LONG TST, NE IF,          \ add backplane cull check here
      ' NormDiff 4- bsr,
      ' (SCAN.ALL.MAP.EDGES) 4- BSR,
      0 +YBASESCAN A6 I) PUSH,
      0 +YMAXSCAN A6 I) PUSH,
      ' (MaPOLYSCAN) 4- BSR,
    THEN,
  THEN,
  RESTORE.POLY.REGS
  RTS, END-CODE

  PROC.END


4 ' (DRAW.MAPPOLY1 4-  SET.JUMP.TOKEN


PROC.START
CODE (TRANS.POINT
  SAVE.POLY.REGS
  ' (TRANS.POINT) 4- BSR,
  RESTORE.POLY.REGS
RTS,  END-CODE
PROC.END

8 ' (TRANS.POINT 4-  SET.JUMP.TOKEN


PROC.START
CODE (JUST.TRANS.CLIP
  SAVE.POLY.REGS
  ' (JUST.TRANS.CLIP) 4- BSR,
  RESTORE.POLY.REGS
RTS, END-CODE
PROC.END

9 ' (JUST.TRANS.CLIP 4-  SET.JUMP.TOKEN

PROC.START
CODE (TWO.VECTOR
```

```
  SAVE.POLY.REGS
  ' (TWO.VECTOR) 4- BSR,
  RESTORE.POLY.REGS
RTS, END-CODE
PROC.END

10 ' (TWO.VECTOR 4-  SET.JUMP.TOKEN

PROC.START
CODE (CROSS.PRODUCT
  SAVE.POLY.REGS
  ' (CROSS.PRODUCT) 4- BSR,
  RESTORE.POLY.REGS
RTS, END-CODE
PROC.END

11 ' (CROSS.PRODUCT 4-  SET.JUMP.TOKEN

PROC.START
CODE (GET.COLOR.INDEX
    SAVE.POLY.REGS
    ' GET.COLOR.INDEX, 4- BSR,
    RESTORE.POLY.REGS
  RTS, END-CODE
PROC.END

12 ' (GET.COLOR.INDEX 4-  SET.JUMP.TOKEN

PROC.START
CODE (FULL.SHADE
    SAVE.POLY.REGS
    ' (MAP.SHADE) 4- BSR,
    RESTORE.POLY.REGS
  RTS, END-CODE
PROC.END

13 ' (FULL.SHADE 4-  SET.JUMP.TOKEN

PROC.START
CODE (Normalize
    SAVE.POLY.REGS
    ' (NORMALIZE,) 4- BSR,
    RESTORE.POLY.REGS
  RTS, END-CODE
PROC.END

14 ' (Normalize 4-  SET.JUMP.TOKEN
```

```
\ Default Extensions file

\ (c) Copyright 1987 by Creative Solutions, Inc.
\ All Rights Reserved.

\ Permission is hereby granted to registered MacForth customers to use
\ this source code in their own applications, provided that the author
\ acknowledges Creative Solutions' contribution within the application's
\ documentation, and/or "credit screen". Distribution or other use of
\ this source code is prohibited.

hex FFFF,FE8F io.events ! decimal   \ hold off activates till done extending


find Expanded not
iftrue

  20,000 minimum.object
   8,000 minimum.vocab

  create Expanded
  cr ." Loading extensions" cr

  include" current directory"

  SetCD" :extensions"
  cdinclude" Kernel Corrections"     \ repair Kernel FIX 3500402
  cdinclude" Axing"          \ axe words not in glossary
    cdinclude" Misc Support"      \ Load Program dev extensions ie. WORDS
  cdinclude" SetWmgrProcs"      \ Override Wmgr Procs
  cdinclude" double.click"
  cdinclude" alerts"
  cdinclude" memorydump"
  cdinclude" +apple menu"   Apple.Menu
  cdinclude" +file menu"
  cdinclude" All Traps"
  cdinclude" +options menu"   Options.Menu
  cdinclude" +edit menu"
  cdinclude" +Tools Menu"   ToolsMenu
  cdinclude" CSI Graphics"
  cdinclude" High-level Files"
  cdinclude" Sound"
  cdinclude" Dialogs"
  cdinclude" Tasking"
  cdinclude" Loop Checking"

\ cdinclude" Advanced Graphics"   \ optional
\ cdinclude" Controls"        \ optional
\ cdinclude" Text Edit"       \ optional
\ cdinclude" Color"         \ Quickdraw color
\ cdinclude" Filter Procs"      \ Quickdraw color
\ cdinclude" Command Line Edit"   \ Try Editor interactive mode
    include" Paper"
    include" Sibley Editor"
\   include" Delete/Stamp"      \ optional
ifend


16,000 minimum.object
 1,000 minimum.vocab

apple.menu
file.menu
edit.menu
```

```
FIND options.menu
iftrue  options.menu   ifend

find ToolsMenu iftrue ToolsMenu  ifend

find error.alert iftrue
  token.for error.alert (error) !
  token.for abort.alert (abort) !
ifend

find could.alert
   iftrue  400 could.alert  400 center.alert   ifend

find install.se       \ if sibley editor is present, install it
   iftrue   install.se  ifend

find install.cle
   iftrue install.cle ifend

find InstallDSTool    \ install Delete/Stamp tool group if it's compiled
    IFTRUE  InstallDSTool
        " ???" 1+ INITIALS 3 CMOVE    \ set YOUR initials here
    IFEND

find InstallWCMTool   \ install WCM tool group if it's compiled
  IFTRUE    InstallWCMTool
  IFEND

find assembler
     iftrue " ASSEMBLER"  GET.VOCAB   ' ASSEMBLER !
     ifend

"  YH" 1+ initials 3 cmove
.

events on

find edit.files   \ if sibley editor is present, go edit or print files
  IFTRUE    edit.files
  IFEND


event.loop         \ wait for sys.window activate
```

```
\ makes a display segment

hex

 code SWIVDisplaySeg
   d3 pop,
    begin,
      0 # wpush,
      a974 w,      \ button
      d0 wpop,
    ne
    until,
   d3 push,
   rts, end-code

decimal

HERE ' SWIVDisplaySeg 4- 7000 " SWIVDisplay" MAKE.CODE.SEGMENT

hex

 code SWIVInitDisplaySeg
   d3 pop,
   d3 push,
   rts, end-code

decimal

HERE ' SWIVInitDisplaySeg 4- 7001 " SWIVInitDisplay" MAKE.CODE.SEGMENT
```

```
CREATE -DISPLAY.SEG.START-

\ utils to make code seg, these are forgotten

INCLUDE" CodeSegUtils"

\ make a display seg for use with vcrs...

INCLUDE" DISPLAY.SEG"

\ forget all poly stuff plus set-up

FORGET -DISPLAY.SEG.START-
```

```
\ dots
\ Last Revision: 11/18/87  10:32:17 AM   YH

cr ." Loading dot drawing..."

 : XORDOT.2 ( X, Y )  assembler     \ writes dot to poly screen
    SAVE.REGS
   D0 GET,                  \ fetch y
    2 SP@, D0 LONG OR,           \ or with x
    D0 SCAN.RECORD# -1 * WORD ANDI, EQ IF, \ if within index
       ^SCAN.ARRAY   A1 )#MOVE,       \ a0 is scan array
   A1 () A0 LONG MOVE,
   SCAN.INDEX  A1 )#MOVE,         \ a1 is scan index
     D0 POP, D1 POP,
   D0 2 # WORD ASL,           \ y * 2
   D0 0 WORD A1 @I) D3 LONG MOVE,    \ fetch index to array
     D3 0 LONG A0 @I) A2 LONG MOVE,    \ a2 = start yscan address
       D1 2 # WORD ASL,          \ x * 2
   D1 0 WORD A1 @I) D3 LONG MOVE,    \ fetch x index to array
     D3 X.BYTE LONG A0 @I) D0 WORD MOVE, \ d0 = xbyte
     D3 X.BIT  LONG A0 @I) D2 WORD MOVE, \ d2 = xbit
     D0 0 WORD A2 @I) D2 BCHG,       \ xor the bit
    ELSE,   SP 8 LONG ADDQ, THEN,      \ else clear stack
  RESTORE.REGS ;


 : SETDOT.2   ( X, Y )   assembler     \ writes dot to poly screen
    SAVE.REGS
   D0 GET,                  \ fetch y
    2 SP@, D0 LONG OR,           \ or with x
    D0 SCAN.RECORD# -1 * WORD ANDI, EQ IF, \ if within index
        ^SCAN.ARRAY   A1 )#MOVE,       \ a0 is scan array
   A1 () A0 LONG MOVE,
   SCAN.INDEX  A1 )#MOVE,         \ a1 is scan index
     D0 POP, D1 POP,
   D0 2 # WORD ASL,           \ y * 2
   D0 0 WORD A1 @I) D3 LONG MOVE,    \ fetch index to array
     D3 0 LONG A0 @I) A2 LONG MOVE,    \ a2 = start yscan address
       D1 2 # WORD ASL,          \ x * 2
   D1 0 WORD A1 @I) D3 LONG MOVE,    \ fetch x index to array
     D3 X.BYTE LONG A0 @I) D0 WORD MOVE, \ d0 = xbyte
     D3 X.BIT  LONG A0 @I) D2 WORD MOVE, \ d2 = xbit
     D0 0 WORD A2 @I) D2 BSET,       \ SET the bit
    ELSE,   SP 8 LONG ADDQ, THEN,     \ else clear stack
  RESTORE.REGS ;



 : CLRDOT.2 ( X, Y )   assembler     \ writes dot to poly screen
     SAVE.REGS
   D0 GET,                  \ fetch y
    2 SP@, D0 LONG OR,           \ or with x
    D0 SCAN.RECORD# -1 * WORD ANDI, EQ IF,       \ if within index
        ^SCAN.ARRAY   A1 )#MOVE,       \ a0 is scan array
   A1 () A0 LONG MOVE,
   SCAN.INDEX  A1 )#MOVE,         \ a1 is scan index
     D0 POP, D1 POP,
   D0 2 # WORD ASL,           \ y * 2
   D0 0 WORD A1 @I) D3 LONG MOVE,    \ fetch index to array
     D3 0 LONG A0 @I) A2 LONG MOVE,    \ a2 = start yscan address
       D1 2 # WORD ASL,          \ x * 2
   D1 0 WORD A1 @I) D3 LONG MOVE,    \ fetch x index to array
     D3 X.BYTE LONG A0 @I) D0 WORD MOVE, \ d0 = xbyte
     D3 X.BIT  LONG A0 @I) D2 WORD MOVE, \ d2 = xbit
```

```
 DO 0 WORD A2 @I) D2 BCLR,        \ xor the bit
 ELSE,   SP 8 LONG ADDQ. THEN,      \ else clear stack
RESTORE.REGS ;


: XORDOT.8 ( X, Y ) assembler        \ writes dot to poly screen
  SAVE.REGS
 DO GET,                 \ fetch y
  2 SP@, DO LONG OR,            \ or with x
  DO SCAN.RECORD# -1 * WORD ANDI, EQ IF,       \ if within index
     ^SCAN.ARRAY   A1 )#MOVE,       \ a0 is scan array
 A1 () A0 LONG MOVE,
 SCAN.INDEX  A1 )#MOVE,         \ a1 is scan index
   DO POP, D1 POP,
 DO 2 # WORD ASL,           \ y * 2
 DO 0 WORD A1 @I) D3 LONG MOVE,     \ fetch index to array
   D3 0 LONG A0 @I) A2 LONG MOVE,     \ a2 = start yscan address
     D1 2 # WORD ASL,           \ x * 2
 D1 0 WORD A1 @I) D3 LONG MOVE,     \ fetch x index to array
   D3 X.BYTE LONG A0 @I) DO WORD MOVE, \ d0 = xbyte
   DO 0 WORD A2 @I)  -1 BYTE EORI,    \ xor the byte
  ELSE,   SP 8 LONG ADDQ, THEN,      \ else clear stack
RESTORE.REGS ;


: SETDOT.8  ( X, Y )   assembler     \ writes dot to poly screen
  SAVE.REGS
 DO GET,                 \ fetch y
  2 SP@, DO LONG OR,            \ or with x
  DO SCAN.RECORD# -1 * WORD ANDI, EQ IF,       \ if within index
     ^SCAN.ARRAY   A1 )#MOVE,       \ a0 is scan array
 A1 () A0 LONG MOVE,
 SCAN.INDEX  A1 )#MOVE,         \ a1 is scan index
   DO POP, D1 POP,
 DO 2 # WORD ASL,           \ y * 2
 DO 0 WORD A1 @I) D3 LONG MOVE,     \ fetch index to array
   D3 0 LONG A0 @I) A2 LONG MOVE,     \ a2 = start yscan address
     D1 2 # WORD ASL,           \ x * 2
 D1 0 WORD A1 @I) D3 LONG MOVE,     \ fetch x index to array
   D3 X.BYTE LONG A0 @I) DO WORD MOVE, \ d0 = xbyte
 -1 D2 MOVEQ,
   D2 DO 0 WORD A2 @I) BYTE MOVE,     \ SET the bit
 ELSE,   SP 8 LONG ADDQ, THEN,      \ else clear stack
RESTORE.REGS ;


: CLRDOT.8  ( X, Y )  assembler     \ writes dot to poly screen
SAVE.REGS
DO GET,                 \ fetch y
  2 SP@, DO LONG OR,            \ or with x
  DO SCAN.RECORD# -1 * WORD ANDI, EQ IF,       \ if within index
     ^SCAN.ARRAY   A1 )#MOVE,       \ a0 is scan array
 A1 () A0 LONG MOVE,
 SCAN.INDEX  A1 )#MOVE,         \ a1 is scan index
   DO POP, D1 POP,
 DO 2 # WORD ASL,           \ y * 2
 DO 0 WORD A1 @I) D3 LONG MOVE,     \ fetch index to array
   D3 0 LONG A0 @I) A2 LONG MOVE,     \ a2 = start yscan address
     D1 2 # WORD ASL,           \ x * 2
 D1 0 WORD A1 @I) D3 LONG MOVE,     \ fetch x index to array
   D3 X.BYTE LONG A0 @I) DO WORD MOVE, \ d0 = xbyte
   0 D2 MOVEQ,
   D2 DO 0 WORD A2 @I) BYTE MOVE,
  ELSE,   SP 8 LONG ADDQ, THEN,      \ else clear stack
```

```
RESTORE.REGS ;

: SHADEDOT.8  ( X, Y )   assembler   \ writes dot to poly screen
  SAVE.REGS
  D0 GET,                       \ fetch y
    2 SP@, D0 LONG OR,              \ or with x
    D0 SCAN.RECORD# -1 * WORD ANDI, EQ IF,       \ if within index
       ^SCAN.ARRAY   A1 )#MOVE,       \ a0 is scan array
   A1 () A0 LONG MOVE,
   SCAN.INDEX  A1 )#MOVE,          \ a1 is scan index
     D0 POP, D1 POP,
   D0 2 # WORD ASL,              \ y * 2
   D0 0 WORD A1 @I) D3 LONG MOVE,     \ fetch index to array
     D3 0 LONG A0 @I) A2 LONG MOVE,     \ a2 = start yscan address
       D1 2 # WORD ASL,             \ x * 2
   D1 0 WORD A1 @I) D3 LONG MOVE,     \ fetch x index to array
     D3 X.BYTE LONG A0 @I) D0 WORD MOVE, \ d0 = xbyte
   SHADE.INDEX A0 )#MOVE,
   0 D2 MOVEQ,
       D0 0 WORD A2 @I) D2 BYTE MOVE,     \ fetch index
   D2 0 WORD A0 @I) D3 BYTE MOVE,
   D3 D0 0 WORD A2 @I) BYTE MOVE,     \ store.shade
    ELSE,   SP 8 LONG ADDQ, THEN,       \ else clear stack
  RESTORE.REGS ;

 CODE SETDOT
    POLY.DEPTH A0 )#MOVE,
    A0 () 1 LONG CMPI, EQ IF,
    SETDOT.2 ELSE,
    SETDOT.8 THEN,
    NEXT END-CODE

 CODE CLRDOT
    POLY.DEPTH A0 )#MOVE,
    A0 () 1 LONG CMPI, EQ IF,
    CLRDOT.2 ELSE,
    CLRDOT.8 THEN,
    NEXT END-CODE

 CODE XORDOT
    POLY.DEPTH A0 )#MOVE,
    A0 () 1 LONG CMPI, EQ IF,
    XORDOT.2 ELSE,
    XORDOT.8 THEN,
    NEXT END-CODE

 CODE SHADEDOT
     POLY.DEPTH A0 )#MOVE,
     A0 () 1 LONG CMPI, EQ IF,
     SETDOT.2 ELSE,
     SHADEDOT.8 THEN,
     NEXT END-CODE
```

```
\ dots
\ Last Revision: 11/18/87  10:32:17 AM   YH

cr ." Loading dot drawing..."

 : XORDOT ( X, Y ) assembler         \ writes dot to poly screen
    SAVE.REGS
   D0 GET,                    \ fetch y
     2 SP@, D0 LONG OR,            \ or with x
     D0 SCAN.RECORD# -1 * WORD ANDI, EQ IF,       \ if within index
        ^SCAN.ARRAY   A1 )#MOVE,       \ a0 is scan array
    A1 () A0 LONG MOVE,
    SCAN.INDEX  A1 )#MOVE,         \ a1 is scan index
      D0 POP, D1 POP,
    D0 2 # WORD ASL,            \ y * 2
    D0 0 WORD A1 @I) D3 LONG MOVE,    \ fetch index to array
      D3 0 LONG A0 @I) A2 LONG MOVE,    \ a2 = start yscan address
        D1 2 # WORD ASL,            \ x * 2
    D1 0 WORD A1 @I) D3 LONG MOVE,    \ fetch x index to array
      D3 X.BYTE LONG A0 @I) D0 WORD MOVE, \ d0 = xbyte
      D0 0 WORD A2 @I)  -1 BYTE EORI,   \ xor the byte
     ELSE,   SP 8 LONG ADDQ, THEN,      \ else clear stack
  RESTORE.REGS ;


 : SETDOT  ( X, Y )   assembler     \ writes dot to poly screen
    SAVE.REGS
   D0 GET,                    \ fetch y
     2 SP@, D0 LONG OR,            \ or with x
     D0 SCAN.RECORD# -1 * WORD ANDI, EQ IF,       \ if within index
        ^SCAN.ARRAY   A1 )#MOVE,       \ a0 is scan array
    A1 () A0 LONG MOVE,
    SCAN.INDEX  A1 )#MOVE,         \ a1 is scan index
      D0 POP, D1 POP,
    D0 2 # WORD ASL,            \ y * 2
    D0 0 WORD A1 @I) D3 LONG MOVE,    \ fetch index to array
      D3 0 LONG A0 @I) A2 LONG MOVE,    \ a2 = start yscan address
        D1 2 # WORD ASL,            \ x * 2
    D1 0 WORD A1 @I) D3 LONG MOVE,    \ fetch x index to array
      D3 X.BYTE LONG A0 @I) D0 WORD MOVE. \ d0 = xbyte
    -1 D2 MOVEQ,
      D2 D0 0 WORD A2 @I) BYTE MOVE,    \ SET the bit
    ELSE,   SP 8 LONG ADDQ, THEN,      \ else clear stack
  RESTORE.REGS ;


 : CLRDOT  ( X, Y )  assembler     \ writes dot to poly screen
  SAVE.REGS
  D0 GET,                    \ fetch y
    2 SP@, D0 LONG OR,            \ or with x
    D0 SCAN.RECORD# -1 * WORD ANDI, EQ IF,       \ if within index
       ^SCAN.ARRAY   A1 )#MOVE,       \ a0 is scan array
   A1 () A0 LONG MOVE,
   SCAN.INDEX  A1 )#MOVE,         \ a1 is scan index
     D0 POP, D1 POP,
   D0 2 # WORD ASL,            \ y * 2
   D0 0 WORD A1 @I) D3 LONG MOVE,    \ fetch index to array
     D3 0 LONG A0 @I) A2 LONG MOVE,    \ a2 = start yscan address
       D1 2 # WORD ASL,            \ x * 2
   D1 0 WORD A1 @I) D3 LONG MOVE,    \ fetch x index to array
     D3 X.BYTE LONG A0 @I) D0 WORD MOVE, \ d0 = xbyte
     0 D2 MOVEQ,
     D2 D0 0 WORD A2 @I) BYTE MOVE,
```

```
   ELSE,   SP 8 LONG ADDQ, THEN,      \ else clear stack
 RESTORE.REGS ;


: SHADEDOT  ( X, Y )   assembler   \ writes dot to poly screen
  SAVE.REGS
  D0 GET,                    \ fetch y
    2 SP@, D0 LONG OR,            \ or with x
    D0 SCAN.RECORD# -1 * WORD ANDI, EQ IF,       \ if within index
       ^SCAN.ARRAY   A1 )#MOVE,       \ a0 is scan array
   A1 () A0 LONG MOVE,
   SCAN.INDEX  A1 )#MOVE,         \ a1 is scan index
     D0 POP, D1 POP,
   D0 2 # WORD ASL,           \ y * 2
   D0 0 WORD A1 @I) D3 LONG MOVE,     \ fetch index to array
     D3 0 LONG A0 @I) A2 LONG MOVE,     \ a2 = start yscan address
       D1 2 # WORD ASL,           \ x * 2
   D1 0 WORD A1 @I) D3 LONG MOVE,     \ fetch x index to array
     D3 X.BYTE LONG A0 @I) D0 WORD MOVE, \ d0 = xbyte
   SHADE.INDEX A0 )#MOVE,
   0 D2 MOVEQ,
       D0 0 WORD A2 @I) D2 BYTE MOVE,    \ fetch index
   D2 0 WORD A0 @I) D3 BYTE MOVE,
   D3 D0 0 WORD A2 @I) BYTE MOVE,     \ store.shade
    ELSE,   SP 8 LONG ADDQ, THEN,      \ else clear stack
 RESTORE.REGS ;
```

```
\ error alert for swivel

cr ." Loading Error Alerts... "

\ alerts

CR  ." Loading Alerts ... "


( WPUSH WPOP , ALERT PRIMITIVES )                  ( 093086 YH )

  CODE WPUSH D0 POP, D0 SP -) WORD MOVE, NEXT END-CODE

  CODE WPOP SP )+ D0 WORD MOVE, D0 PUSH, NEXT END-CODE


  HEX
     A986 MT    (STOP.ALERT)
   A988 MT    (CAUTION.ALERT)
  DECIMAL


( ALERTS )                                         ( 093086 YH )
    CREATE IALERT 0 ,


   : STOP.ALERT       ( ALERT NUMBER | ITEM SELECTED )
       >R   0 wpush R> WPUSH 0 (STOP.ALERT) wpop ialert ! ;

   : CAUTION.ALERT    ( ALERT NUMBER | ITEM SELECTED )
       >R   0 wpush R> WPUSH 0 (CAUTION.ALERT) wpop ialert ! ;


( alert constants )                                ( 120886 YH )

 421   constant display.memory.alert
 2101  constant Revert.Alert



VARIABLE ERROR.NUMBER 40 ALLOT


 \ ERROR HANDLING

 CREATE 'STR  ,"    STR "
 'STR 4+ @ CONSTANT "STR

  : DO.ERROR.ALERT
    0 LOCALS| STR.HANDLE |
    ERROR.FLAG IF
      0 ?HEAP.SIZE MINHEAPSIZE > IF
        "STR ERROR.FLAG ABS
        GET.RESOURCE TO STR.HANDLE
        STR.HANDLE IF
          STR.HANDLE LOCK.HANDLE
          STR.HANDLE @ "" "" "" 401 IssueAlert
          DROP
        ELSE
          " System Error -"
          ERROR.NUMBER 12 BLANKS
          ERROR.FLAG abs ERROR.NUMBER AUTO.NUMBER!
```

```
      10 ERROR.NUMBER C!
      ERROR.NUMBER "" "" 401 IssueAlert
      DROP
    THEN
  THEN
THEN ;
```

```
\ forth glue routines for poly libs

." Loading Poly Glue "
cr

anew -polyglue-


:  Load.BW.PolyProcs
  0 LOCALS| THE.SEG |
  POLYBLOCK @ IF
    POLYBLOCK @ UNLOCK.HANDLE
    POLYBLOCK @ TO.HEAP
    0  POLYBLOCK !
  THEN
  ASCII CODE 6100 GET.RESOURCE TO THE.SEG
  THE.SEG IF
    THE.SEG DETACH.RESOURCE
    THE.SEG LOCK.HANDLE
    THE.SEG POLYBLOCK !
  ELSE
    " Unable to load Poly Procs"
    "" "" ""
    401 issuealert
    0  POLYBLOCK !
    bye
  then ;


:  Load.Color.PolyProcs
  0 LOCALS| THE.SEG |
  POLYBLOCK @ IF
    POLYBLOCK @ UNLOCK.HANDLE
    POLYBLOCK @ TO.HEAP
    0  POLYBLOCK !
  THEN
  ASCII CODE 6200 GET.RESOURCE TO THE.SEG
  THE.SEG IF
    THE.SEG DETACH.RESOURCE
    THE.SEG LOCK.HANDLE
    THE.SEG POLYBLOCK !
  ELSE
    " Unable to load Poly Procs"
    "" "" ""
    401 issuealert
    0  POLYBLOCK !
    bye
  then ;


CODE TRANS.POINT
  POLYBLOCK a0 )#move,
  8 8 * # 0 +POLYSELECT A0 I) LONG MOVE,
  A0 PUSH,
  A0 () A0 LONG MOVE,
  A0 () A0 LONG MOVE,
  A0 () JSR,
NEXT END-CODE


CODE JUST.TRANS.CLIP
  POLYBLOCK a0 )#move,
  9 8 *  # 0 +POLYSELECT A0 I) LONG MOVE,
  A0 PUSH,
```

```
  A0 () A0 LONG MOVE,
  A0 () A0 LONG MOVE,
  A0 () JSR,
NEXT END-CODE

CODE TWO.VECTOR
  POLYBLOCK a0 )#move,
  10 8 *  # 0 +POLYSELECT A0 I) LONG MOVE,
  A0 PUSH,
  A0 () A0 LONG MOVE,
  A0 () A0 LONG MOVE,
  A0 () JSR,
NEXT END-CODE

CODE CROSS.PRODUCT
  POLYBLOCK a0 )#move,
  11 8 *  # 0 +POLYSELECT A0 I) LONG MOVE,
  A0 PUSH,
  A0 () A0 LONG MOVE,
  A0 () A0 LONG MOVE,
  A0 () JSR,
NEXT END-CODE

CODE GET.COLOR.INDEX
  POLYBLOCK a0 )#move,
  12 8 *  # 0 +POLYSELECT A0 I) LONG MOVE,
  A0 PUSH,
  A0 () A0 LONG MOVE,
  A0 () A0 LONG MOVE,
  A0 () JSR,
  NEXT END-CODE

CODE FULL.SHADE
  POLYBLOCK a0 )#move,
  13 8 *  # 0 +POLYSELECT A0 I) LONG MOVE,
  A0 PUSH,
  A0 () A0 LONG MOVE,
  A0 () A0 LONG MOVE,
  A0 () JSR,
  NEXT END-CODE

CODE ((NORMALIZE))
  POLYBLOCK a0 )#move,
  14 8 *  # 0 +POLYSELECT A0 I) LONG MOVE,
  A0 PUSH,
  A0 () A0 LONG MOVE,
  A0 () A0 LONG MOVE,
  A0 () JSR,
  NEXT END-CODE

CODE (DRAW.POLY)
  RENDER.MODE a0 )#move,
  A0 () D0 LONG MOVE,
  D0 2 LONG SUBQ,
  D0 3 # LONG ASL,
  POLYBLOCK a0 )#move,
  D0 0 +POLYSELECT A0 I) LONG MOVE,
  A0 PUSH,
  A0 () A0 LONG MOVE,
  A0 () A0 LONG MOVE,
  A0 () JSR,
  NEXT END-CODE
```

```
: DRAW.POLY
  ALT.POLY @ IF
    ALT.POLY @ EXECUTE
  ELSE
    (DRAW.POLY)
    THEN ;

CODE INIT.BACKPORT
  POLYBLOCK a0 )#move,
  16 8 *  # 0 +POLYSELECT A0 I) LONG MOVE,
  A0 PUSH,
  A0 () A0 LONG MOVE,
  A0 () A0 LONG MOVE,
  A0 () JSR,
NEXT END-CODE

CODE INIT.ZBUFFER
  POLYBLOCK a0 )#move,
  17 8 *  # 0 +POLYSELECT A0 I) LONG MOVE,
  A0 PUSH,
  A0 () A0 LONG MOVE,
  A0 () A0 LONG MOVE,
  A0 () JSR,
NEXT END-CODE

CODE INIT.SCAN.ARRAY
  POLYBLOCK a0 )#move,
  18 8 *  # 0 +POLYSELECT A0 I) LONG MOVE,
  A0 PUSH,
  A0 () A0 LONG MOVE,
  A0 () A0 LONG MOVE,
  A0 () JSR,
NEXT END-CODE
```

```
\ heap utilities

cr ." Loading Heap Utils..."


 : HEAP.VARIABLE
 0 0 LOCALS| C.HANDLE C.POINTER C.SIZE |
 C.SIZE RSRVMEM  0 = IF
    C.SIZE FROM.HEAP  TO C.HANDLE
  C.HANDLE HANDLE.SIZE C.SIZE = IF
      C.HANDLE @ TO C.POINTER
      C.HANDLE LOCK.HANDLE
    C.POINTER C.SIZE ERASE
        C.HANDLE C.POINTER
  ELSE
    0 0
  THEN
   ELSE
    0 0
 THEN  ;


 : THEAP.VARIABLE
 0 0 LOCALS| C.HANDLE C.POINTER C.SIZE |
 C.SIZE RSRVMEM  0 = IF
    C.SIZE FROM.HEAP  TO C.HANDLE
    C.HANDLE @ TO C.POINTER
    C.HANDLE LOCK.HANDLE
  C.POINTER C.SIZE ERASE
    C.HANDLE  C.POINTER
   ELSE
   -108 TO ERROR.FLAG
   DO.ERROR.ALERT
  THEN  ;


 : FROM.MIN.HEAP
   LOCALS| THE.SIZE |
   0 ?HEAP.SIZE THE.SIZE MINHEAPSIZE + > IF
     THE.SIZE FROM.HEAP
   ELSE
     0
   THEN ;
```

```
\ initializes poly vars, allocates memory

PROC.START

  Code OpenGDevice
     >R,
     0 # 0 +polyerror a6 I) long move,          \ clear error.flag
     0 lit,
     _GetGDevice w,
     d3 pop,                        \ d3 is old device
     0 +temppointl a6 I) pea,
    _GetPort w,

     0 +^polybits a6 I) long tst, ne if,
        0 +^polybits a6 I) a0 long move,
      _HUnlock w,
      0 +^polybits a6 I) a0 long move,
      _DisposHandle w,
      0 # 0 +^polybits a6 I) long move,
    then,
    0 +zbufferx a6 I) d0 long move,
    d0 7 long addq,
    d0 3 # long asr,
    d0 3 # long asl,
    2 +zbuffery a6 I) d0 muls,
    0 # a0 long move,
    _NewHandle w,
    d0 word tst, ne if,
      d0 long ext,
      d0 0 +PolyError a6 I) long move,
      0 # a0 long move,
    else,
      _HLock w,                     \ if no error, lock down
    then,
    a0 0 +^polybits a6 I) long move,            \ move handle into ^polybits
    a0 () 0 +polybits a6 I) long move,          \ move pointer into polybits


    0 +BackGDevice a6 I) long tst, ne if,          \ test the Gdevice and
       0 +BackGDevice a6 I) push,              \ dispose if necessary
     _DisposGDevice w,
     0 # 0 +BackGDevice a6 I) long move,
    then,


     0 +^polybits a6 I) long tst, ne if.l,         \ if polybits are there...
       0 lit,
       0 # wpush,
       -1 lit,
       _NewGDevice w,                  \ allocate the new device
     d6 pop, ne if.l,                  \ d6 is the new gdevice
       d6 0 +BackGDevice a6 I) long move,
       d6 a1 long move,
       a1 () a2 long move,
       0 +gdPMap a2 I) d7 long move,           \ d7 is the pixmap for the gdevice
       0 lit,
       300  # wpush,
       _GetCTable w,
       d5 pop, ne if.l,                \ d5 is new color table
         d6 a1 long move,
         a1 () a0 long move,           \ a0 is ptr to the new device
         0 # 0 +gdID a0 I) word move,        \ set the device id
         0 # 0 +gdType a0 I) word move,        \ set the device type
         d7 a2 long move,
```

```
   a2 () a0 long move,              \ a0 is ptr to the pixmap
   0 +pmtable a0 I) push,              \ push a handle to the ctab
   _DisposCTable w,              \ throw the gdevice's ctab away...
   d5 push,
   _DetachResource w,              \ convert to just a handle
   d7 a2 long move,
   a2 () a0 long move,              \ a0 is pointer to pixmap
   d5 0 +pmtable a0 I) long move,          \ put new ctab in pixmap
   0 lit,                 \ room for return
   _GetCtSeed w,                 \ get a new seed
   d5 pop,                 \ d5 is the seed
   d7 a2 long move,              \ a2 is temp pixmap
   a2 () a0 long move,              \ a0 is pointer to pixmap
   0 +pmtable a0 I) a0 long move,          \ a0 is handle to pixmap ctab
   a0 () a0 long move,              \ a0 is pointer to ctab
   d5 0 +ctseed a0 I) long move,          \ move ion the new seed value
   d6 a1 long move,              \ a1 is temp gdevice handle
   a1 () a0 long move,              \ a0 is ptr to the new device
   gdFlagsSet # 0 +gdflags a0 I) word move,  \ set the flags
   4 # 0 +gdResPref a0 I) word move,      \ set the res pref to 4
   0 # 0 +gdSearchProc a0 I) long move,    \ use default procs
   0 # 0 +gdCompProc a0 I) long move,
   d7 a2 long move,              \ a2 is temp pixmap
   a2 () a0 long move,              \ a0 is pointer to pixmap
   0 +pmtable a0 I) push,              \ push handle to ctab
   d6 a1 long move,              \ a1 is temp gdevice handle
   a1 () a0 long move,              \ a0 is pointer to pixmap
   0 +gditable a0 I) push,              \ push handle to ctab
   4 # wpush,                 \ push resolution
   _MakeITable w,              \ make the inverse table
   0 # wpush,
   _QDerror w,                 \ test for error
   d0 wpop, ne if,
     d0 0 +polyerror a6 I) long move,
   then,
 else,
   -108 # 0 +polyerror a6 I) long move,
 then,
else,
 -108 # 0 +polyerror a6 I) long move,
then,
0 +polyerror a6 I) long tst, eq if,           \ if we had no error...
 0 +BackGDevice a6 I) d6 long move,
 d6 a1 long move,                 \ a1 is temp gdevice handle
 a1 push,
 _SetGDevice w,                 \ set new device as current
 d6 a1 long move,                 \ a1 is temp gdevice handle
 a1 () a2 long move,
 0 +gdPMap a2 I) a2 long move,             \ d7 is the pixmap for the gdevice
 a2 () a2 long move,              \ a2 is pointer to pixmap
 0 # 0 upbounds a2 I) long move,           \ set the bitmap rect
   2 +zbuffery a6 I) 0 downbounds a2 I) word move,
   2 +zbufferx a6 I) 0 rightbounds a2 I) word move,
   0 +zbufferx a6 I) d0 long move,
 d0 7 long addq,
   d0 3 # long asr,
   d0 3 # long asl,
 d0 0 +polyrow a6 I) long move,           \ set the rowbytes
   d0 RowMask long addi,
 d0  0 rowbytes a2 I) word move,
 8 # 0 pixelsize  a2 I) word move,         \ set the pixel size
 8 # 0 cmpsize  a2 I) word move,           \ set the cmp size
 1 # 0 cmpCount  a2 I) word move,
 0 +polybits a6 I) 0 baseaddr  a2 I) long move,    \ set the base address
```

```
      d6 a1 long move,                  \ a1 is temp gdevice handle
      a1 () a2 long move,
      0 # 0 +gdRect a2 I) long move,
      2 +zbuffery a6 I)  4 +gdRect a2 I) word move,   \ set the gdevice bounds
      2 +zbufferx a6 I)  6 +gdRect a2 I) word move,
    else,
      0 +BackGDevice a6 I) a1 long move,
      ne if,
        a1 push,
        _DisposGDevice  w,                 \ if an error,
        0 # 0 +BackGDevice a6 I) long move,
      then,
      0 +^polybits a6 I) long tst, ne if,
        0 +^polybits a6 I) a0 long move,
        _HUnlock w,
        0 +^polybits a6 I) a0 long move,
        _DisposHandle w,
        0 # 0 +^polybits a6 I) long move,
      then,
    then,
  then,
  d3 push,
  _SetGdevice w,
  0 +temppoint1 a6 I) long tst, ne if,
    0 +temppoint1 a6 I) push,
    _SetPort w,
  then,
  R>,  RTS,  end-code

PROC.END


PROC.START

 Code OpenCBackPort                    \ inits a new background bw port
  >R,
    0 +temppoint1 a6 I) pea,
    _GetPort w,
    0 +CurrentBackPort a6 I) a4 long move,
    2 a4 I) long tst, ne if,              \ test if already inited...
        a4 push,
        _CloseCPort w,                 \ close if needed
    then,
    a4 push,
    _OpenCPort w,                    \ open if needed
    0 +BackGDevice a6 I) a2 long move,
    a2 () a2 long move,
    0 +gdpmap a2 I) a2 long move,
    a2 a0 long move,
    0 d0 moveq,
    _gethandlesize w,
    d0 long tst, ne if,
    d0 1 long subq,
    a2 () a2 long move,
    2 a4 I) a0 long move,               \ a0 is the handle to the pixmap
    a0 () a0 long move,               \ a0 is the pointer to the pixmap
    begin,
      a2 )+ a0 )+ byte move,
      d0 loop,
    then,
    0 # 104 a4 I) LONG MOVE,
    2 a4 I) a0 long move,               \ a0 is the handle to the pixmap
    a0 () a0 long move,
    0 upbounds a0 I) 16 a4 I) long move,        \ set window bounds
```

```
  0 downbounds a0 I) 20 a4 I) long move,
  24 a4 I) push,
  16 a4 I) pea,
  _RectRgn w,                    \ set visregion to bounds
  16 a4 I) pea,
  _ClipRect w,                   \ set cliprect to window bounds
  0 +temppoint1 a6 I) long tst, ne if,
  0 +temppoint1 a6 I) push,
  _SetPort w,
  then,
R>, RTS, end-code


Code OpenBackDevice
 Save.poly.regs
  0 +temppoint2 a6 I) pea,
  _GetPort w,
  0 lit,
   _GetGDevice w, >R,
    8 # 0 +polydepth a6 I) long move,
    ' OpenGDevice 4- bsr,
    0 +BackGDevice a6 I) long tst, ne if,
      0 +BackGDevice a6 I)  push,
      _SetGDevice w,
      ' OpenCBackPort 4- bsr,
    then,
   R>, _SetGDevice w,
   0 +temppoint2 a6 I) long tst, ne if,
     0 +temppoint2 a6 I) push,
     _SetPort w,
     then,
  RESTORE.POLY.REGS
  rts,  end-code

PROC.END

16 ' OpenBackDevice 4-  SET.JUMP.TOKEN


PROC.START

code MakeZbuffer
  save.poly.regs
  0 +Zbufferx a6 I) d0 long move,
  Z.RECORD # d1 long move,
  d1 d0 mulu,
  0 +Zbuffery A6 I) d1 long move,
  d1 d0 mulu,
  0 # a0 long move,
  _NewHandle  w,
  d0 word tst, ne if,
    d0 long ext,
    d0 0 +PolyError a6 I) long move,
    0 # 0 +Zbuffer a6 I) long move,
  else,
    _HLock w,
    A0 0 +^Zbuffer a6 I) long move,
    A0 () 0 +Zbuffer a6 I) long move,
    A0 () D0 long move,
    d0 Z.RECORD 2/ long addq,
    d0 0 +Obuffer a6 I) long move,
    0 # 0 +PolyError a6 I) long move,
  then,
```

```
  restore.poly.regs
  rts,  end-code

PROC.END

17 ' MakeZbuffer 4-  SET.JUMP.TOKEN


PROC.START

CODE SET.YTAB                        \ sets y values in scan array
    >R,
  0 +scan.array A6 I) A1 LONG MOVE,          \ a1 is current poly record
    0 D6 MOVEQ,
  BEGIN,
    0 +POLYYMAX A6 I) d0 long move,
    D0 1 LONG ADDQ, D0 D6 LONG CMP, GT IF,
      0 +POLYBITS A6 I) A1 () LONG MOVE,
      ELSE,
          0 +POLYYMIN A6 I) D0 LONG MOVE,
      D6 D0 LONG ADD,
      2 +POLYROW A6 I) D0 MULU,
      0 +POLYBITS A6 I) D0 LONG ADD,
      D0  A1 () LONG MOVE,
        THEN,
      SCAN.RECORD.LENGTH # A1 LONG ADDA,
      D6 1 LONG ADDQ,
    D6 SCAN.RECORD# LONG CMPI,
  PL UNTIL,
  R>,
  RTS, END-CODE

PROC.END


PROC.START

CODE SET.XTAB
  >R,
  0 +SCAN.ARRAY A6 I) A1 LONG MOVE,          \ a1 is current poly record
  0 D6 MOVEQ,
  PL IF,
    BEGIN,
      0 +POLYXMAX A6 I) D6 LONG CMP, PL IF,
        0 D2 MOVEQ,              \ clip if out of range
        ELSE,
        D6 D2 LONG MOVE,            \ else use count
      THEN,
        0 +POLYXMIN A6 I) D2 LONG ADD,       \ add offset for min
        D2 X.BYTE A1 I) WORD MOVE,        \ d2 is xbyte
        7 D0 MOVEQ,              \ use full bit mask
        D0 X.BIT A1 I) WORD MOVE,
      SCAN.RECORD.LENGTH # A1 LONG ADDA,      \ add increments
        D6 1 LONG ADDQ,
      D6 SCAN.RECORD# LONG CMPI,
    PL UNTIL,
  THEN,
  R>,
  RTS, END-CODE

PROC.END


PROC.START
```

```
CODE SET.ZTAB                      \ sets y values in scan array
    >R,
  0 +SCAN.ARRAY A6 I) A1 LONG MOVE,            \ a1 is current poly record
    Z.ADDRESS # A1 LONG ADDA,
  0 D6 MOVEQ,
  BEGIN,
    0 +POLYYMAX A6 I) d0 long move,
    D0 1 LONG ADDQ, D0 D6 LONG CMP, GT IF,
      0 +ZBUFFER A6 I) A1 () LONG MOVE,
      ELSE,
          0 +POLYYMIN A6 I) D0 LONG MOVE,
      D6 D0 LONG ADD,
      Z.RECORD D1 MOVEQ,
      D1 D0 MULU,
      2 +ZBUFFERX A6 I) D0 MULU,
      0 +ZBUFFER A6 I) D0 LONG ADD,
      D0  A1 () LONG MOVE,
        THEN,
      SCAN.RECORD.LENGTH # A1 LONG ADDA,
      D6 1 LONG ADDQ,
    D6 SCAN.RECORD# LONG CMPI,
   PL UNTIL,
   R>,
   RTS, END-CODE

 PROC.END


 PROC.START

 code INIT.SCAN.ARRAY
   >R,

   0 d0 moveq,
   D0 0 +POLYYMIN A6 I) LONG MOVE,
   D0 0 +TPOLYYMIN A6 I) LONG MOVE,
   D0 0 +POLYXMIN A6 I) LONG MOVE,
   D0 0 +TPOLYXMIN A6 I) LONG MOVE,

   0 +ZBUFFERY a6 I) D0 LONG MOVE,
   d0 2 long subq,
     D0 0 +POLYYMAX a6 I) LONG MOVE,
   D0 0 +TPOLYYMAX a6 I) LONG MOVE,
   FIX.SCALE 1- d1 moveq,
   D0 D1 LONG ASL,
   D0 D1 LONG MOVE,
   D1 LONG NEG,
   D1 0 +TOPPLANE A6 I) LONG MOVE,
   D0 1 LONG SUBQ,
   D0 0 +BOTTOMPLANE A6 I) LONG MOVE,


   0 +ZBUFFERX a6 I) D0 LONG MOVE,
   d0 2 long subq,
   D0 0 +POLYXMAX a6 I) LONG MOVE,
   D0 0 +TPOLYXMAX a6 I) LONG MOVE,
   FIX.SCALE 1- d1 moveq,
   D0 D1 LONG ASL,
   D0 0 +RIGHTPLANE A6 I) LONG MOVE,
   D0 LONG NEG,
   D0 0 +LEFTPLANE A6 I) LONG MOVE,

   ' SET.YTAB 4- BSR,
```

```
  ' SET.XTAB 4- BSR,
  ' SET.ZTAB 4- BSR,
  R>,
  rts, end-code

PROC.END


PROC.START

code Make8ScanArray
  save.poly.regs
  SCAN.RECORD.LENGTH SCAN.RECORD#  * # d0 long move,
  0 # a0 long move,
  _NewHandle  w,
  d0 word tst, ne if,
    d0 long ext,
    d0 0 +PolyError a6 I) long move,
    0 # 0 +Zbuffer a6 I) long move,
  else,
    _HLock w,
    A0 0 +(scan.array) a6 I) long move,
    A0 () 0 +SCAN.ARRAY a6 I) long move,
    ' init.scan.array 4- bsr,
  then,
  restore.poly.regs
  rts,  end-code

PROC.END

18 ' Make8ScanArray 4- SET.JUMP.TOKEN


HERE ' POLYSEGMENT 4- 6200 " ColorPolyLib" MAKE.CODE.SEGMENT
```

```
anew -initpoly-

hex

 a874     constant _GetPort
 a873     constant _SetPort
 a86f     constant _OpenPort
 a122 200 + constant _NewHandle
 a023   constant _DisposHandle
 a025     constant _gethandlesize
 a029     constant _HLock
 a02a     constant _HUnlock
 a87b     constant _ClipRect
 a8df     constant _RectRgn
 aa32     constant _GetGDevice
 aa31     constant _SetGDevice
 aa30     constant _DisposGDevice
 aa2f   constant _NewGDevice
 aa39     constant _MakeITable
 aa18     constant _GetCTable
 aa24     constant _DisposCTable
 aa28     constant _GetCtSeed
 aa40     constant _QDerror
 aa00   constant _OpenCPort
 a87d   constant _CloseCPort
 a992     constant _DetachResource

decimal


   2 base !
     1100010000000001  constant gdFlagsSet   \ flags for offscreen gdevice
   decimal
```

```
\ ANEW NTHREE

cr ." Loading new tree list "
CODE INTERPLOT
                        \ 0 LOCALS| CURRENT.CZ  CENTER.Z  CURRENT.CONTOUR CCONTOUR.Y CCONTOUR.X |
  SAVE.REGS
  ' SCALE.RANGE A0 )#MOVE,              \ A0 IS SCALE.RANGE
  A0 () D6 LONG MOVE,                   \ D6 IS CONTENTS OF SCALE RANGE
  ' GRAPHIC.SCALE ' SCALE.RANGE - A0 I) D7 LONG MOVE, \ D7 IS GRAPHIC.SCALE
  0 D2 MOVEQ,                      \ D2 IS CURRENT.CZ
  D3 POP,                          \ CENTER.Z
  A1 POP,                          \ CURRENT.CONTOUR
  D4 POP,                          \ CCONTOUR.Y
  D5 POP,                          \ CCONTOUR.X
                                  \ FIRST CALCULATE X
  D5 LONG TST, MI IF,                  \ CCONTOUR.X 0 < IF
    DOWNTOP     2+ A1 I) D0 WORD MOVE,      \ CURRENT.CONTOUR DOWNSIDE + 2+ W@ ext
  ELSE,
    UPTOP    2+ A1 I)  D0 WORD MOVE,        \ CURRENT.CONTOUR UPSIDE +   2+ W@ ext
  THEN,
  D5 D1 LONG MOVE,
  D1 ABS,
  D1  D0 MULS,
  D0 SHIFT.SCALE                   \ convert to scale.range for graphic scale
  D0 PUSH,                         \ now x is on stack

  D4 LONG TST, MI IF,                  \ CCONTOUR.Y 0 < IF
    DOWNSIDE    2+ A1 I) D0 WORD MOVE,        \ CURRENT.CONTOUR DOWNTOP +   2+ W@ ext
  ELSE,
    UPSIDE    2+ A1 I) D0 WORD MOVE,        \ CURRENT.CONTOUR UPTOP +     2+ W@ ext
  THEN,
  D4 D1 LONG MOVE,
  D1 ABS,
  D1  D0 MULS,                     \ SCALE X TO CCONTOUR.Y
  D0 SHIFT.SCALE                     \ convert to scale.range for graphic scale
  D0 PUSH,                         \ now y is on stack
                                  \ last calculate z
  D4 LONG TST, MI IF,                  \ CCONTOUR.Y 0 < IF
    DOWNSIDE      A1 I) D0 WORD MOVE,         \ CURRENT.CONTOUR DOWNTOP +  W@ ext
  ELSE,
    UPSIDE    A1 I) D0 WORD MOVE,           \ CURRENT.CONTOUR UPTOP +   W@ ext
  THEN,
    D3 D0 WORD SUB,                  \  CENTER.Z -
    D4 ABS,                        \  CCONTOUR.Y ABS  *
    D4 D0 MULS,
    D0 D2 LONG MOVE,
  D5 LONG TST, MI IF,                  \ CCONTOUR.X 0 < IF
    DOWNTOP  A1 I) D0 WORD MOVE,          \ CURRENT.CONTOUR DOWNTOP +  W@ ext
  ELSE,
    UPTOP    A1 I)  D0 WORD MOVE,          \ CURRENT.CONTOUR UPTOP +   W@ ext
  THEN,
    D3 D0 WORD SUB,                  \  CENTER.Z -
    D5 ABS,                        \  CCONTOUR.X ABS  *
    D5 D0 MULS,
    D0 PUSH,                       \ save zx on stack
    D2 PUSH,                       \ save zy on stack
    D0 ABS,
    D2 ABS,
    D0 D2 LONG CMP, MI IF,               \ check which to use
      DROP,
    ELSE,
      NSWAP, DROP,
    THEN,
```

```
 D0 POP,                     \ pop our choice into d0
   D0 LONG NEG,
   D3 LONG NEG,
 D7 D3 MULS,                   \ scale d3 by graphic scale
 D0 D3 LONG ADD,                 \ add to our zoffset
 D3 SHIFT.SCALE
   D3 PUSH,                    \ push resulting z
 RESTORE.REGS
NEXT END-CODE
```

```
( THREE.LIST, WRITES, SWIVELS  ALL.POINTS ARRAY)  ( 123185 yh )

 CODE GRADE.Z
 >R,
  D4 POP,
  D4 D0 WORD CMP, EQ IF,
   D4 SWAP,
   D4 01 WORD ADDI,
   D4 SWAP,
  THEN,
  D4 D1 WORD CMP, EQ IF,
   D4 SWAP,
   D4 01 WORD ADDI,
   D4 SWAP,
  THEN,
  D4 D2 WORD CMP, EQ IF,
   D4 SWAP,
   D4 01 WORD ADDI,
   D4 SWAP,
  THEN,
  D4 D3 WORD CMP, EQ IF,
   D4 SWAP,
   D4 01 WORD ADDI,
   D4 SWAP,
  THEN,
  D4 PUSH,
 R>,
  RTS, END-CODE


CODE FIND.CENTER.Z
   SAVE.REGS
   D0 POP,
   CONTOUR A0 )#MOVE,
   D0 A0 LONG ADDA,
    0 D0 MOVEQ,
    0 D1 MOVEQ,
    0 D2 MOVEQ,
    0 D3 MOVEQ,
   UPTOP    A0 I) D0 WORD MOVE,
   DOWNTOP  A0 I) D1 WORD MOVE,
   UPSIDE   A0 I) D2 WORD MOVE,
   DOWNSIDE   A0 I) D3 WORD MOVE,
   D0 PUSH, ' GRADE.Z 4- BSR, D0 POP,
   D1 PUSH, ' GRADE.Z 4- BSR, D1 POP,
   D2 PUSH, ' GRADE.Z 4- BSR, D2 POP,
   D3 PUSH, ' GRADE.Z 4- BSR, D3 POP,
   D0 SWAP,
   D1 SWAP,
   D2 SWAP,
```

```
D3 SWAP,
DO D1 WORD CMP, PL IF,
 D1 DO LONG MOVE,
  THEN,
DO D2 WORD CMP, PL IF,
 D2 DO LONG MOVE,
  THEN,
DO D3 WORD CMP, PL IF,
 D3 DO LONG MOVE,
  THEN,
DO 1 WORD CMPI, EQ IF,
 DO SWAP,
 D1 SWAP,
 D2 SWAP,
 D3 SWAP,
 DO LONG EXT,
 D1 LONG EXT,
 D2 LONG EXT,
 D3 LONG EXT,
 D1 DO LONG ADD,
   D2 DO LONG ADD,
   D3 DO LONG ADD,
   DO 2 # LONG ASR,
   DO SWAP,
THEN,
DO SWAP,
DO LONG EXT,
DO PUSH,
RESTORE.REGS
NEXT END-CODE


: NTHREE.LIST
  0  0  8  LOCALS| ALL.POINTER CURRENT.CONTOUR CENTER.Z |
  CONTOUR @ 4+ 4 DO
  I contour + to CURRENT.CONTOUR
  I FIND.CENTER.Z TO CENTER.Z
    CCONTOUR @  4+ 4 DO
    CCONTOUR I +  W@ EXT        \ INDEXED START ADDRESS
      CCONTOUR I + 2+ W@ EXT
    CURRENT.CONTOUR
    CENTER.Z
      INTERPLOT
    AllPoints
    ALL.POINTER +
    FROM.STACK
        ALL.POINTER  12 + TO ALL.POINTER
  4 +LOOP
  4 +LOOP
CONTOUR @  4/   AllPoints !
CCONTOUR @ 4/   AllPoints 4+ ! ;


find nthree.list ' three.token !
```

```
anew object.defs
cr ." Loading Object Definitions"

( ADD.OBJECT.RECORD )                              ( 112086 YH )

  0 CONSTANT RECORD.LENGTH
  0 CONSTANT USER.OBJECT
  0 CONSTANT OBJECT.LIST

  : SET.CURRENT.OBJECT,  ASSEMBLER
    SET.CURRENT.RECORD, ;

 :  (SET.CURRENT.OBJECT),  ASSEMBLER
    SET.CURRENT.RECORD, ;

  CODE SET.CURRENT.OBJECT
       SET.CURRENT.RECORD,
      NEXT END-CODE

 CODE CURRENT.TEST (SET.CURRENT.OBJECT), NEXT END-CODE

 : ADD.OBJECT.RECORD              \ creates new object type
   ADD.RESOURCE.RECORD ;              \ address , length in bytes

124 constant OLD.ATTRIBUTES1.SIZE

( OBJECT RECORD DEFINITIONS )                    ( 111386 YH )

ASCII SWIV META.WORLD LAST.OBJECT 1+ NEW.RESOURCE.RECORDS  OBJECT.RECORDS

0 CONSTANT OBJECT.PFA.START

    0  WORDS     ADD.OBJECT.RECORD   (OBJECT.RECORD)
    1  LONGS   ADD.OBJECT.RECORD   OBJECT.APP
    1  WORDS   ADD.OBJECT.RECORD   OBJECT.VERSION
    1  WORDS     ADD.OBJECT.RECORD   OBJECT.INDEX
    1  WORDS   ADD.OBJECT.RECORD   OBJECT.DELTA
   11  WORDS     ADD.OBJECT.RECORD   OBJECT.STRING
    1  WORDS     ADD.OBJECT.RECORD   OBJECT.LEVEL
    1  WORDS     ADD.OBJECT.RECORD   OBJECT.REFLECT
    3  WORDS     ADD.OBJECT.RECORD OBJECT.RGBCOLOR       \ rgb body color
    1  WORDS     ADD.OBJECT.RECORD OBJECT.PALETTE.INDEX    \ index of palette for object
    1  WORDS     ADD.OBJECT.RECORD OBJECT.MATERIAL.INDEX   \ index for material
   192  WORDS    ADD.OBJECT.RECORD OBJECT.ATTRIBUTES1
     16  WORDS     ADD.OBJECT.RECORD   OBJECT.TEXT.FIELD0
     16  WORDS     ADD.OBJECT.RECORD   OBJECT.TEXT.FIELD1
     16  WORDS     ADD.OBJECT.RECORD   OBJECT.TEXT.FIELD2
     16  WORDS     ADD.OBJECT.RECORD   OBJECT.TEXT.FIELD3
     16  WORDS     ADD.OBJECT.RECORD   OBJECT.TEXT.FIELD4
   16  WORDS     ADD.OBJECT.RECORD   OBJECT.TEXT.FIELD5
   16  WORDS     ADD.OBJECT.RECORD   OBJECT.TEXT.FIELD6
   16  WORDS     ADD.OBJECT.RECORD   OBJECT.TEXT.FIELD7
    1  WORDS     ADD.OBJECT.RECORD   OBJECT.RENDER
      2  WORDS     ADD.OBJECT.RECORD   OBJECT.OPERATION
      3  LONGS     ADD.OBJECT.RECORD   OBJECT.A3POS
      3  LONGS     ADD.OBJECT.RECORD   OBJECT.R3POS
```

```
3 LONGS ADD.OBJECT.RECORD OBJECT.R3CENTER
2 WORDS ADD.OBJECT.RECORD OBJECT.A2POS
1 LONGS ADD.OBJECT.RECORD OBJECT.SPECULAR.SCALE
1 LONGS ADD.OBJECT.RECORD OBJECT.DIRECT.SCALE
1 LONGS ADD.OBJECT.RECORD OBJECT.ROUGHNESS
4 WORDS ADD.OBJECT.RECORD OBJECT.RECT
6 LONGS ADD.OBJECT.RECORD OBJECT.RCUBE
6 LONGS ADD.OBJECT.RECORD OBJECT.ACUBE
6 COS.SIZE ADD.OBJECT.RECORD OBJECT.ACOS
6 COS.SIZE ADD.OBJECT.RECORD OBJECT.RCOS
20 BYTES ADD.OBJECT.RECORD OBJECT.MATERIAL.NAME
1 WORDS ADD.OBJECT.RECORD OBJECT.MATERIAL.TYPE
10 WORDS ADD.OBJECT.RECORD O.RESERVED2
1 LONGS ADD.OBJECT.RECORD OBJECT.SCALE
1 LONGS ADD.OBJECT.RECORD OBJECT.RSCALE
1 WORDS ADD.OBJECT.RECORD UP.TREE
1 WORDS ADD.OBJECT.RECORD DOWN.TREE
1 WORDS ADD.OBJECT.RECORD RIGHT.TREE
1 WORDS ADD.OBJECT.RECORD LEFT.TREE
1 WORDS ADD.OBJECT.RECORD LINK.TYPE
1 WORDS ADD.OBJECT.RECORD YAW.INPUT \ input for external attitude drivers
1 WORDS ADD.OBJECT.RECORD PITCH.INPUT
1 WORDS ADD.OBJECT.RECORD ROL.INPUT
2 WORDS ADD.OBJECT.RECORD YAW.RANGE
2 WORDS ADD.OBJECT.RECORD PITCH.RANGE
2 WORDS ADD.OBJECT.RECORD ROL.RANGE
2 LONGS ADD.OBJECT.RECORD X.RANGE
2 LONGS ADD.OBJECT.RECORD Y.RANGE
2 LONGS ADD.OBJECT.RECORD Z.RANGE
1 WORDS ADD.OBJECT.RECORD ATT.GRID
1 LONGS ADD.OBJECT.RECORD OBJECT.SCALE.UNIT \ number of scaled units to reference units
1 LONGS ADD.OBJECT.RECORD OBJECT.MEASURE.TO.SCREEN
1 WORDS ADD.OBJECT.RECORD OBJECT.MEASURE.DIV \ number of divisions in unit
1 WORDS ADD.OBJECT.RECORD OBJECT.MEASURE.REF \ unit type of reference
1 WORDS ADD.OBJECT.RECORD X.INPUT \ input for external position drivers
1 WORDS ADD.OBJECT.RECORD Y.INPUT
1 WORDS ADD.OBJECT.RECORD Z.INPUT
2 LONGS ADD.OBJECT.RECORD O.RESERVED5
1 LONGS ADD.OBJECT.RECORD OBJECT.RULER.UNIT \ number of reference units to scaled units
1 WORDS ADD.OBJECT.RECORD OBJECT.MEASURE.SCALE \ unit type of scaled
9 WORDS ADD.OBJECT.RECORD OBJECT.ATTRIBUTES2
1 WORDS ADD.OBJECT.RECORD OBJECT.FORM.RENDER
1 WORDS ADD.OBJECT.RECORD OBJECT.FORM.EDIT
1 WORDS ADD.OBJECT.RECORD OBJECT.FORM
10 WORDS ADD.OBJECT.RECORD OBJECT.TYPE

END.RES.RECORDS


\ tweening vars, array in object.attributes1, Key.Max is number of records in array

STRUCTURE KEY.FRAME.RECORD
  SHORT: KEY.STATE.COUNT
  LONG:  KEY.POSX
  LONG:  KEY.POSY
  LONG:  KEY.POSZ
  SHORT: KEY.ROLL
  SHORT: KEY.PITCH
  SHORT: KEY.YAW
  LONG:  KEY.SCALE
STRUCTURE.END

' OBJECT.ATTRIBUTES1 4+ @ EXT KEY.FRAME.RECORD / CONSTANT KEY.MAX
10 CONSTANT DEFAULT.FRAME.COUNT
```

```
0 CONSTANT OBJECT.PFA.END

 OBJECT.RECORDS )CONSTANT CURRENT.OBJECT

 : OBJECT.STATE RES.STATE ;

 -128 CONSTANT THE.END

  CURRENT.COUNT @  ' RECORD.LENGTH !

  RECORD.LENGTH ' (OBJECT.RECORD) 6+ w!


 : (ALL.POINTS)
  OBJECT.TYPE DROP
  LOCALS| O.TYPE |
  O.TYPE
    O.TYPE @ O.TYPE 4+ @ *
  3POINT.LENGTH * 8 +
  WORD.TYPE OR  ;


 : (CONTOUR)           \ returns start of contour record
  OBJECT.TYPE DROP
  DUP @ 4+ 4*
  WORD.TYPE OR     ;

 : (UPSIDE)
  OBJECT.TYPE DROP
  DUP @ 4+
  WORD.TYPE OR     ;

 : (DOWNSIDE)
  OBJECT.TYPE DROP
   DUP @ 4+ DUP>R +
   R> WORD.TYPE OR    ;

 : (UPTOP)
   OBJECT.TYPE DROP
   DUP @ 4+ DUP>R 2* +
   R> WORD.TYPE OR    ;

 : (DOWNTOP)
  OBJECT.TYPE DROP
   DUP @ 4+ DUP>R 3 * +
   R> WORD.TYPE OR    ;


  : (CCONTOUR)         \ returns start of ccontour record
   OBJECT.TYPE DROP
   DUP @ 4+ 4* +
   DUP @ 4+ WORD.TYPE OR  ;

  : SIZE.OF.NEW.RECORD
   CONTOUR  @
   4+ 4*
   CCONTOUR @
   4+ +
   ' OBJECT.TYPE @ +  ;

  : SIZE.OF.CURRENT.RECORD
   CURRENT.SIZE ;
```

```
: SET.RECORD.SIZE
  SIZE.OF.CURRENT.RECORD
  SIZE.OF.NEW.RECORD
  LOCALS| N.SIZE C.SIZE |
  N.SIZE C.SIZE  = NOT IF
    N.SIZE RESIZE.RES.RECORD
    IF
      CONTOUR @ OBJECT.TYPE DROP !
      CCONTOUR @
      OBJECT.TYPE DROP
      CONTOUR @ 4+ 4* + !       \ reset size markers
      -1
    ELSE
      0
    THEN
  ELSE
      CONTOUR @ OBJECT.TYPE DROP !
      CCONTOUR @
      OBJECT.TYPE DROP
      CONTOUR @ 4+ 4* + !       \ reset size markers
      -1
    THEN ;


  : SET.ALL.POINT.SIZE
    AllPoints @ AllPoints 4+ @ *
    3POINT.LENGTH * 16 +
    ' OBJECT.TYPE @ +
    SIZE.OF.CURRENT.RECORD
    LOCALS| O.SIZE N.SIZE |
    O.SIZE N.SIZE = NOT IF
      N.SIZE RESIZE.RES.RECORD
      IF
        AllPoints @ OBJECT.TYPE DROP !
        AllPoints 4+ @ OBJECT.TYPE DROP 4+ !
        -1
      ELSE 0 THEN
    ELSE
      AllPoints @ OBJECT.TYPE DROP !
      AllPoints 4+ @ OBJECT.TYPE DROP 4+ !
      -1
    THEN ;

\ pict.form words

  : OBJECT.PICT
    OBJECT.TYPE  DROP
    LOCALS| O.TYPE |
    O.TYPE
    CURRENT.HANDLE HANDLE.SIZE
    ' OBJECT.TYPE @ -
    LONG.TYPE OR  ;


 : OBJECT.RECORD
   (OBJECT.RECORD) DROP
   SIZE.OF.CURRENT.RECORD
   LONG.TYPE OR ;


  : >OBJECT.RECORDS
   OBJECT.RECORDS CURRENT.RECORDS ! ;

  : SET.OBJECT.LIST
```

```
 >OBJECT.RECORDS
   LOAD.RECORDS  ;

\ Object record handlers

 : DELETE.OBJECT.RECORD
 >OBJECT.RECORDS
 DELETE.RES.RECORD ;


 : OBJECT.CHANGED
 >OBJECT.RECORDS
 CURRENT.CHANGED
 OBJECT.CHANGE.TOKEN EXECUTE ;


 : CLEAR.OBJECTS            ( -- sets objects to empty values )
   >OBJECT.RECORDS
  DELETE.RECORDS ;


: GET.NEXT.OBJECT                     ( -- sets next unused object )
 >OBJECT.RECORDS
    NEW.RES.RECORD ;              ( 0 is return for out.of.memory )
```

```
\ PLUCK, PLACE AND TYPED RECORD HANDLERS
\ copyright 1987 by Young Harvill
\ all rights reserved
\ these words fetch and store sub-records of different sizes and type
\ to and from the stack
\ new version which modifies the compilation of these words for speed
\ Last Revision: 08/25/87  11:59:27 PM   YH

CR
." Loading pluck and place "

ANEW PLUCKO


: MASK.TYPE,  ASSEMBLER
  TYPE.MASK LONG ANDI, ;

: LAST.WORD.PFA  HERE 2- W@ TOKEN>ADDR 4 + ;

  CODE MOVE.RECORD
     D0 POP,
     D0 MASK.TYPE,
     A0 POP, A1 POP,
     D0 01 LONG SUBQ,
     BEGIN,
        A1 )+ A0 )+ BYTE MOVE,
     D0 LOOP,
    NEXT END-CODE

  CODE ERASE.RECORD
     D0 POP, A0 POP,
     D0 MASK.TYPE,
     D0 01 LONG SUBQ,
     0 D1 MOVEQ,
     BEGIN,
        D1  A0 )+ BYTE MOVE,
     D0 LOOP,
    NEXT END-CODE

  CODE BLANK.RECORD
     D0 POP,
     D0 MASK.TYPE,
     A0 POP,
     D0 01 LONG SUBQ,
     32 D1 MOVEQ,
     BEGIN,
        D1  A0 )+ BYTE MOVE,
     D0 LOOP,
    NEXT END-CODE

  CODE  COMPARE.RECORD    \ ADDRESS1 ADDRESS2 #BYTES -- CHANGED FLAG
     D2 POP,
     D2 MASK.TYPE,
     A0 POP,
     A1 POP,
     0 D0 MOVEQ,
     D2 1 LONG SUBQ, PL IF,
      BEGIN,
        A0  A1 . BYTE CMPM,
        NE IF,
          -1 D0 MOVEQ,
```

```
      THEN,
    D2 LOOP,
  THEN,
  D0 PUSH,
NEXT END-CODE


CODE D.SWAP
  D0 POP,
  D0 SWAP,
  D0 PUSH,
NEXT END-CODE

 CODE HIGH.BYTE
  SP () D0 BYTE MOVE,
  D0 WORD EXT,
  D0 LONG EXT,
  D0 SP () LONG MOVE,
NEXT END-CODE

 : BPLUCK, ASSEMBLER
 D3 MASK.TYPE,
      D3 A0 LONG ADDA,
        D3 01 LONG SUBQ,
        BEGIN,  A0 -) D0 BYTE MOVE,
        D0 WORD EXT,
    D0 LONG EXT, D0 PUSH,
        D3 LOOP, ;

 CODE BPLUCK D3 POP, A0 POP, BPLUCK, NEXT END-CODE


   : WPLUCK, ASSEMBLER
  D3 MASK.TYPE,
       D3 A0 LONG ADDA,
         D3 01 # LONG LSR,
       D3 01 LONG SUBQ,
         BEGIN,  A0 -) D0 WORD MOVE,
         D0 LONG EXT, D0 PUSH,
         D3 LOOP,  ;

 CODE  WPLUCK D3 POP, A0 POP, WPLUCK, NEXT END-CODE

: LPLUCK, ASSEMBLER
   D3 MASK.TYPE,
     D3 A0 LONG ADDA,
         D3 02 # LONG LSR,
        D3 01 LONG SUBQ,
         BEGIN,  A0 -) SP -) LONG MOVE,
         D3 LOOP, ;

 CODE LPLUCK D3 POP, A0 POP, LPLUCK, NEXT END-CODE


 : BPLACE,  ASSEMBLER
   D3 MASK.TYPE,
       D3  01  LONG SUBQ,
       BEGIN,  SP )+  D0 LONG MOVE,
         D0  A0 )+ BYTE MOVE,
     D3 LOOP, ;

 CODE BPLACE D3 POP, A0 POP, BPLACE, NEXT END-CODE
```

```
: WPLACE, ASSEMBLER
  D3 MASK.TYPE,
     D3  01 # LONG LSR,
     D3  01   LONG SUBQ,
     BEGIN,  SP )+  D0 LONG MOVE,
       D0  A0 )+ WORD MOVE,
   D3 LOOP, ;

CODE WPLACE D3 POP, A0 POP, WPLACE, NEXT END-CODE

: LPLACE,  ASSEMBLER
   D3 MASK.TYPE,
  D3 02 # LONG LSR,
  D3  01  LONG SUBQ,
     BEGIN,  SP )+  A0 )+ LONG MOVE,
   D3 LOOP, ;

CODE LPLACE  D3 POP, A0 POP, LPLACE, NEXT END-CODE


 : PLUCKI
  DUP HIGH.BYTE CASE
    BYTES OF BPLUCK ENDOF
    WORDS OF WPLUCK ENDOF
    LONGS OF LPLUCK ENDOF
   ENDCASE ;


 : PLUCK ( ADDRESS  NO# OF WORDS )
 0 LOCALS| THE.PFA |
 COMPILING IF
   LAST.WORD.PFA TO THE.PFA
     THE.PFA  ' OBJECT.PFA.START >
   THE.PFA  ' OBJECT.PFA.END < AND IF
    THE.PFA 4 + C@ CASE
      BYTES OF COMPILE BPLUCK ENDOF
      WORDS OF COMPILE WPLUCK ENDOF
      LONGS OF COMPILE LPLUCK ENDOF
    ENDCASE
  ELSE
    COMPILE PLUCKI
  THEN
 ELSE
  PLUCKI
 THEN ;

 IMMEDIATE


   : PLACEI
     DUP HIGH.BYTE CASE
    BYTES OF BPLACE ENDOF
    WORDS OF WPLACE ENDOF
    LONGS OF LPLACE ENDOF
   ENDCASE ;


  : PLACE ( ADDRESS  NO# OF WORDS )
  0 LOCALS| THE.PFA |
  COMPILING IF
    LAST.WORD.PFA TO THE.PFA
      THE.PFA  ' OBJECT.PFA.START >
    THE.PFA  ' OBJECT.PFA.END < AND IF
     THE.PFA 4 + C@
```

```
    CASE
      BYTES OF COMPILE BPLACE ENDOF
      WORDS OF COMPILE WPLACE ENDOF
      LONGS OF COMPILE LPLACE ENDOF
     ENDCASE
  ELSE
    COMPILE PLACEI
  THEN
 ELSE
  PLACEI
THEN ;

IMMEDIATE


: GET.RECORD.STUFF ASSEMBLER
    DUP @ >R
      A0  )#MOVE,
    4 A0 I) D3 LONG MOVE,
         CURRENT.RECORDS A1 )#MOVE,
    A1 () A0 LONG MOVE,
    C.HANDLE A0 I) A1 LONG MOVE,
    A1 () A0 LONG MOVE,
    R> #  A0 LONG ADDA, ;

( FAST PLUCK )                                      ( 112486 YH )

  : (PLUCK), ASSEMBLER ( ' OBJECT.ITEM --- )
   DUP GET.RECORD.STUFF
   4+ C@ EXT CASE
    BYTES OF BPLUCK, ENDOF
    WORDS OF WPLUCK, ENDOF
    LONGS OF LPLUCK, ENDOF
   ENDCASE ;


  : (PLACE), ASSEMBLER ( ' OBJECT.ITEM --- )
   DUP GET.RECORD.STUFF
   4+ C@ EXT CASE
    BYTES OF BPLACE, ENDOF
    WORDS OF WPLACE, ENDOF
    LONGS OF LPLACE, ENDOF
   ENDCASE ;



( O@, )                                             ( 112486 YH )

  : O@, ASSEMBLER    ( ' OBJECT.ITEM --- )
       DUP GET.RECORD.STUFF
    4+ C@ EXT CASE
     BYTES OF
       A0 () D0 BYTE MOVE,
       D0 WORD EXT,
       D0 LONG EXT,
       D0 PUSH,      ENDOF
     WORDS OF
       A0 () D0 WORD MOVE,
       D0 LONG EXT,
       D0 PUSH,      ENDOF
     LONGS OF
       A0 () SP -) LONG MOVE,
```

```
            ENDOF
    ENDCASE   ;

CODE  COS.PLUCK
    D3 POP, A0 POP, LPLUCK,
    NEXT END-CODE

( OBJECT.RCOS>COSINES )                         ( 112486 YH )

: (OBJECT.RCOS>COSINES)  ASSEMBLER
  ' OBJECT.RCOS
    GET.RECORD.STUFF
    COSINES  A1 )#MOVE,
    A0 )+  A1 )+ COS.ASIZE MOVE,  A0 )-  A1 )+ COS.ASIZE MOVE,
    A0 )+  A1 )+ COS.ASIZE MOVE,  A0 )+  A1 )- COS.ASIZE MOVE,
    A0 )+  A1 )+ COS.ASIZE MOVE,  A0 )+  A1 )- COS.ASIZE MOVE,  ;

( OBJECT.ACOS>COSINES )                         ( 112486 YH )

: (OBJECT.ACOS>COSINES)  ASSEMBLER
  ' OBJECT.ACOS
  GET.RECORD.STUFF
    COSINES  A1 )#MOVE,
    A0 )+  A1 )+ COS.ASIZE MOVE,  A0 )-  A1 )- COS.ASIZE MOVE,
    A0 )+  A1 )+ COS.ASIZE MOVE,  A0 )-  A1 )+ COS.ASIZE MOVE,
    A0 )+  A1 )- COS.ASIZE MOVE,  A0 )-  A1 )- COS.ASIZE MOVE,  ;

( OBJECT.ACOS>COSINES )                         ( 112486 YH )

:  (TVARS>OBJECT.ACOS)  ASSEMBLER
  ' OBJECT.ACOS
  GET.RECORD.STUFF
    T.VARS  A1 )#MOVE,
    A1 )+  A0 )+ COS.ASIZE MOVE,  A1 )-  A0 )- COS.ASIZE MOVE,
    A1 )+  A0 )+ COS.ASIZE MOVE,  A1 )-  A0 )- COS.ASIZE MOVE,
    A1 )+  A0 )+ COS.ASIZE MOVE,  A1 )+  A0 )- COS.ASIZE MOVE,  ;

  CODE TEST.ATVAR  >R, (TVARS>OBJECT.ACOS) R>, RTS,  END-CODE

( OBJECT.ACOS>COSINES )                         ( 112486 YH )

:  (TVARS>OBJECT.RCOS)  ASSEMBLER
  ' OBJECT.RCOS
  GET.RECORD.STUFF
    T.VARS  A1 )#MOVE,
    A1 )+  A0 )+ COS.ASIZE MOVE,  A1 )+  A0 )- COS.ASIZE MOVE,
    A1 )+  A0 )+ COS.ASIZE MOVE,  A1 )-  A0 )- COS.ASIZE MOVE,
    A1 )+  A0 )+ COS.ASIZE MOVE,  A1 )-  A0 )- COS.ASIZE MOVE,  ;

( COS>SAVE)                                     ( 120386 YH )
```

```
VARIABLE TSAVE.COS COS.LENGTH ALLOT

:  (COS>SAVE)  ASSEMBLER
 COSINES    A1 )#MOVE,
   TSAVE.COS  A0 )#MOVE,
   A1 )+  A0 )+ COS.ASIZE MOVE,  A1 )+  A0 )+ COS.ASIZE MOVE,
   A1 )+  A0 )+ COS.ASIZE MOVE,  A1 )+  A0 )+ COS.ASIZE MOVE,
   A1 )+  A0 )+ COS.ASIZE MOVE,  A1 )+  A0 )+ COS.ASIZE MOVE,  ;

 CODE SAVE.COSINES  (COS>SAVE) NEXT END-CODE

                                              ( 120386 YH )

 :  (SAVE>COS) ASSEMBLER
 COSINES    A0 )#MOVE,
   TSAVE.COS  A1 )#MOVE,
   A1 )+  A0 )+ COS.ASIZE MOVE,  A1 )+  A0 )+ COS.ASIZE MOVE,
   A1 )+  A0 )+ COS.ASIZE MOVE,  A1 )+  A0 )+ COS.ASIZE MOVE,
   A1 )+  A0 )+ COS.ASIZE MOVE,  A1 )+  A0 )+ COS.ASIZE MOVE,  ;

   CODE RESTORE.COSINES  (SAVE>COS) NEXT END-CODE

 : O@  DROP ;            : OL@ DROP @ ;

 : OW@ DROP W@ EXT ;     : GET.OP DROP @ ;
```

```
\ OBJECT.UTILITIES

cr ." Loading object utilities..."


: OUT.OF.OBJECT.MEMORY
   -108 TO ERROR.FLAG
   DO.ERROR.ALERT
   META.WORLD SET.CURRENT.OBJECT  ;


: MOVE.CONTOUR
  LOCALS| REC.NUM DEST SOURCE |
  SOURCE @ 4/ MAX.TYPE.POINTS > IF
    MAX.TYPE.POINTS 4* DEST !
    SOURCE 4+ DEST 4+
    MAX.TYPE.POINTS 4* CMOVE
  ELSE
    SOURCE DEST REC.NUM MOVE.RECORD
  THEN ;


: GET.CONTOURS
  OBJECT.FORM PLUCK PATH.FORM = IF
    (UPSIDE) CONTOUR UPSIDE + SWAP MOVE.CONTOUR
    (DOWNSIDE) CONTOUR DOWNSIDE + SWAP MOVE.CONTOUR
    (UPTOP) CONTOUR UPTOP + SWAP MOVE.CONTOUR
    (DOWNTOP) CONTOUR DOWNTOP + SWAP MOVE.CONTOUR
    (CCONTOUR) CCONTOUR SWAP MOVE.CONTOUR
  ELSE
    TRUE ABORT" Not a Path Form Object in Get.Contours"
  THEN
  ;


: PUT.CONTOURS
  SET.RECORD.SIZE
  IF
    CONTOUR UPSIDE + (UPSIDE)  MOVE.RECORD
    CONTOUR DOWNSIDE + (DOWNSIDE) MOVE.RECORD
    CONTOUR UPTOP + (UPTOP) MOVE.RECORD
    CONTOUR DOWNTOP + (DOWNTOP)  MOVE.RECORD
    CCONTOUR (CCONTOUR)  MOVE.RECORD
    PATH.FORM OBJECT.FORM PLACE
  THEN ;


: (GET.MESH)
  0 0 LOCALS| ALL1 ALL2 |
  (ALL.POINTS) DROP @
  MAX.TYPE.POINTS MIN
  ALLPOINTS !
  (ALL.POINTS) DROP 4+ @
  MAX.TYPE.POINTS MIN
  ALLPOINTS 4+ !              \ set allpoints
  (ALL.POINTS) DROP @ 0 DO
    (ALL.POINTS) DROP 4+ @ 0 DO
      I MAX.TYPE.POINTS <
      J MAX.TYPE.POINTS < AND IF
        (ALL.POINTS) DROP 4+ @
        J  * I + 3POINT.LENGTH *
        (ALL.POINTS) DROP 8+ +
        TO ALL1
        ALLPOINTS 4+ @
```

```
        J  * I + 3POINT.LENGTH *
        ALLPOINTS 8+ +
        TO ALL2
        ALL1 @ ALL2 !
        ALL1 4+ @ ALL2 4+ !
        ALL1 8+ @ ALL2 8+ !
      THEN
    LOOP
  LOOP ;


: GET.MESH
  OBJECT.FORM PLUCK MESH.FORM = IF
    (ALL.POINTS) DROP @ MAX.TYPE.POINTS <
    (ALL.POINTS) DROP 4+ @ MAX.TYPE.POINTS < AND IF
      (ALL.POINTS) AllPoints SWAP MOVE.RECORD
    ELSE
      (GET.MESH)
    THEN
  ELSE
    TRUE ABORT" Not a Mesh Form Object in Get.Mesh"
  THEN  ;


: PUT.MESH
  SET.ALL.POINT.SIZE
  IF
    AllPoints (ALL.POINTS) MOVE.RECORD
    MESH.FORM OBJECT.FORM PLACE
    OBJECT.CHANGED
  THEN  ;


: GET.DEFAULT.TYPE
  CONTOUR DEFAULT.TYPE CTYPE.RECORD  CMOVE
  CCONTOUR DEFAULT.TYPE CTYPE.RECORD - C.TYPE.LENGTH CMOVE ;

: PUT.DEFAULT.TYPE
  DEFAULT.TYPE CONTOUR  CTYPE.RECORD  CMOVE
  DEFAULT.TYPE CTYPE.RECORD - CCONTOUR  C.TYPE.LENGTH CMOVE ;

: PUT.DEFAULT.CONTOUR
  DEFAULT.TYPE CTYPE.RECORD - CCONTOUR  C.TYPE.LENGTH CMOVE ;


:  CLEAR.OBJECT                ( clears current object )
  OBJECT.RECORD  ERASE.RECORD
  CURRENT.OBJECT @ WORLD.OBJECT > IF
    CURRENT.OBJECT @ >R
    META.WORLD SET.CURRENT.OBJECT
    GET.CONTOURS
    R> SET.CURRENT.OBJECT
    PUT.CONTOURS
  THEN
  OBJECT.CHANGED ;               ( sets type to cube  )


   VARIABLE DOWN.INSERT
   VARIABLE THIS.LEFT
   VARIABLE THIS.RIGHT
   VARIABLE THIS.LEVEL
   VARIABLE THIS.UP
```

```
VARIABLE BASE.OBJECT   VARIABLE LOW.LEVEL
VARIABLE OPERATION     VARIABLE LEAF.OP     VARIABLE LEAF

: NULL.OP ;
FIND NULL.OP CONSTANT NULL.TO
NULL.TO OPERATION !  NULL.TO LEAF.OP !

: FIND.LOW.LEVEL
  0 SET.CURRENT.OBJECT   0 LOW.LEVEL !
   BEGIN  CURRENT.OBJECT @ 1 + SET.CURRENT.OBJECT
      OBJECT.STATE PLUCK 0 > IF
      OBJECT.LEVEL PLUCK LOW.LEVEL @ > IF
      OBJECT.LEVEL PLUCK LOW.LEVEL ! THEN THEN
  OBJECT.STATE PLUCK
  THE.END =
  CURRENT.OBJECT @
  LAST.OBJECT =  OR
  UNTIL ;

 : BAD.TREE.ALERT
 Sys.Window  WINDOW
 BEGIN
   THE.END =
 UNTIL
 ?TURNKEY if
   " The Tree is damaged ! "
   "" "" ""
   401 ISSUEALERT DROP
 else
   " The Tree is Damaged in "
   OPERATION @ NFA        \ use for debugging and delete one ""
   "" ""
   401 ISSUEALERT DROP
 then
 -1 TO ERROR.FLAG
 THE.END
 THE.END SET.CURRENT.OBJECT
 SYS.WINDOW SELECT.WINDOW  ;


  : REAL.OBJECT?
    CURRENT.OBJECT @ LAST.OBJECT <
    CURRENT.OBJECT @ META.WORLD > AND
    CURRENT.HANDLE 0 = NOT AND ;


 ( TRAVERSE.DOWN.TREE)                        ( 072486 yn )


 : TRAVERSE.DOWN.TREE                    ( does operations down the tree)
   CURRENT.OBJECT @ >R                   ( save current.object to stack )
   THE.END  OPERATION @ EXECUTE          ( the.end marks stack bottom)
   DOWN.TREE PLUCK  SET.CURRENT.OBJECT
    BEGIN BEGIN  CURRENT.OBJECT @
      THE.END = NOT WHILE
    REAL.OBJECT?  NOT IF
    BAD.TREE.ALERT
    ELSE
      OPERATION @ EXECUTE
        RIGHT.TREE PLUCK THE.END = NOT IF     ( no, check siblings)
        RIGHT.TREE PLUCK THEN
        DOWN.TREE PLUCK  SET.CURRENT.OBJECT
    THEN
    REPEAT
```

```
  DUP SET.CURRENT.OBJECT            ( check for siblings on stack)
 THE.END = UNTIL                    ( no siblings left? quit.    )
R> SET.CURRENT.OBJECT ;             ( restore current.object     )


( TRAVERSE.UP.TREE )                             ( 072486 yh )

 : TRAVERSE.UP.TREE            ( does operations up the tree    )
   CURRENT.OBJECT @            ( save current.object to stack   )
   FIND.LOW.LEVEL              ( find lowest level of tree      )
   BEGIN                       ( loop from leaf to trunk        )
     0 SET.CURRENT.OBJECT          ( loop through all objects)
     BEGIN   CURRENT.OBJECT @ 1 -
        SET.CURRENT.OBJECT          ( increment current object)
        OBJECT.STATE PLUCK 0 > IF   ( if active object         )
        OBJECT.LEVEL PLUCK          ( check level              )
        LOW.LEVEL @ = IF          ( if object is current level )
        OPERATION @ EXECUTE       ( then execute operation     )
        THEN THEN
    OBJECT.STATE PLUCK the.end = UNTIL
    LOW.LEVEL @ 1- DUP LOW.LEVEL !  0= UNTIL
    SET.CURRENT.OBJECT ;        ( restore current object)
( WORLD.OBJECT META.WORLD )                      ( 110686 YH )



( RIPPLE.LEVEL )                                 ( 070386 YH )

  : ALIGN.LEVEL
    CURRENT.OBJECT @
    UP.TREE PLUCK SET.CURRENT.OBJECT
    OBJECT.LEVEL PLUCK 1+  SWAP
    SET.CURRENT.OBJECT
    OBJECT.LEVEL PLACE
  OBJECT.CHANGED ;

   FIND ALIGN.LEVEL CONSTANT TALIGN.LEVEL

  : RIPPLE.LEVEL
    CURRENT.OBJECT @  OPERATION @
    TALIGN.LEVEL OPERATION !
    TRAVERSE.DOWN.TREE
    OPERATION !  SET.CURRENT.OBJECT ;



 ( CUT.OBJECT )                                  ( 072486 yh )
  VARIABLE CUT.TEMP

  : INSERT.OBJECT              ( call with current object set )
     CURRENT.OBJECT @  DUP CUT.TEMP !
     1 > IF
     THE.END LEFT.TREE PLACE
     UP.TREE     PLUCK   THIS.UP !
     THIS.UP @ SET.CURRENT.OBJECT
     OBJECT.LEVEL PLUCK 1+ THIS.LEVEL !
     DOWN.TREE PLUCK THIS.RIGHT !
     CUT.TEMP @ DOWN.TREE PLACE
```

```
OBJECT.CHANGED
    THIS.RIGHT @ DUP SET.CURRENT.OBJECT
        THE.END = NOT IF
        CUT.TEMP @ LEFT.TREE PLACE
    OBJECT.CHANGED THEN
  CUT.TEMP @ SET.CURRENT.OBJECT
  THIS.LEVEL @ OBJECT.LEVEL PLACE
  THIS.RIGHT @ RIGHT.TREE PLACE
OBJECT.CHANGED
  RIPPLE.LEVEL THEN ;


: CUT.OBJECT   ( call with current object set )
  CURRENT.OBJECT @  DUP CUT.TEMP !
  WORLD.OBJECT  > IF
   RIGHT.TREE PLUCK THIS.RIGHT !
   LEFT.TREE  PLUCK THIS.LEFT !
   UP.TREE    PLUCK   THIS.UP !
   THIS.UP @ SET.CURRENT.OBJECT
   CUT.TEMP @ DOWN.TREE PLUCK  = IF
       THIS.RIGHT @  DOWN.TREE PLACE
   OBJECT.CHANGED THEN
   THIS.LEFT  @ DUP  SET.CURRENT.OBJECT THE.END = NOT IF
   THIS.RIGHT @  RIGHT.TREE PLACE OBJECT.CHANGED THEN
   THIS.RIGHT @ DUP SET.CURRENT.OBJECT  THE.END = NOT IF
   THIS.LEFT  @ LEFT.TREE PLACE  OBJECT.CHANGED THEN
   CUT.TEMP @ SET.CURRENT.OBJECT
   THE.END DUP LEFT.TREE PlACE RIGHT.TREE PLACE
  OBJECT.CHANGED
   THEN ;


: DEFAULT.OBJECT.NAME
   OBJECTS 1+ OBJECT.STRING MOVE.RECORD
   CURRENT.OBJECT @ WORLD.OBJECT -
 OBJECT.STRING DROP 6 +
  >R  NUMBER>S
    R> SWAP CMOVE ;

:  SET.OBJECT.DEFAULT
     CLEAR.OBJECT
   "SWVL OBJECT.APP PLACE
   CURRENT.VERSION   OBJECT.VERSION  PLACE
   CURRENT.OBJECT @ OBJECT.INDEX PLACE
     1 OBJECT.STATE  PLACE
     2 OBJECT.LEVEL  PLACE
     NULL.TOKEN  OBJECT.OPERATION  O@  !
     XOFFSET @ YOFFSET @ OBJECT.AZPOS PLACE
     ORTHO.COS  OBJECT.ACOS  MOVE.RECORD
     ORTHO.COS  OBJECT.RCOS  MOVE.RECORD
     90  OBJECT.REFLECT  PLACE
    SCALE.RANGE    OBJECT.SCALE       PLACE
    SCALE.RANGE    OBJECT.RSCALE      PLACE
     WORLD.OBJECT  UP.TREE    PLACE
     THE.END       DOWN.TREE  PLACE
     THE.END       RIGHT.TREE PLACE
     THE.END       LEFT.TREE  PLACE
  10 ATT.GRID PLACE
  DEFAULT.SCREEN.TO.MEASURE @
  OBJECT.MEASURE.TO.SCREEN PLACE
  default.ruler.unit @
  OBJECT.RULER.UNIT PLACE
  default.scale.unit @
```

```
OBJECT.SCALE.UNIT PLACE
default.measure.scale @
OBJECT.MEASURE.SCALE PLACE
default.measure.ref  @
OBJECT.MEASURE.REF PLACE
default.measure.div  @
OBJECT.MEASURE.DIV PLACE
POS.RANGE  POS.RANGE NEG  0 INTEGER>FIX DROP
2DUP X.RANGE PLACE
2DUP Y.RANGE PLACE
   Z.RANGE PLACE
FULL.ANGLE 2/ DUP NEG
2DUP YAW.RANGE PLACE
2DUP PITCH.RANGE PLACE
   ROL.RANGE PLACE
DEFAULT.OBJECT.NAME
SHADED OBJECT.RENDER PLACE
PATH.FORM OBJECT.FORM PLACE
SET.DEFAULT.COLOR  ;


: NEW.OBJECT
  GET.NEXT.OBJECT
  CURRENT.OBJECT @ IF     ( ZERO IS OUT.OF.MEMORY CONDITION )
  SET.OBJECT.DEFAULT
  INSERT.OBJECT ELSE
  OUT.OF.OBJECT.MEMORY THEN  ;


: NEW.WORLD
  CLEAR.OBJECTS
  GET.NEXT.OBJECT
    SET.OBJECT.DEFAULT
    THE.END          UP.TREE          PLACE
    THE.END          DOWN.TREE        PLACE
    0                OBJECT.LEVEL     PLACE
  PUT.DEFAULT.TYPE               \ sets default type to cube
  PUT.CONTOURS
  OBJECT.CHANGED
  GET.NEXT.OBJECT
    SET.OBJECT.DEFAULT
    META.WORLD   UP.TREE       PLACE
    1            OBJECT.LEVEL  PLACE
    WORLDS$ 1+   OBJECT.STRING MOVE.RECORD  \ sets world string
  100 OBJECT.REFLECT PLACE          \ set b&w background to white
  NULL.FORM OBJECT.FORM PLACE
  KEY.MAX 0 DO
  DEFAULT.FRAME.COUNT
  OBJECT.ATTRIBUTES1 DROP
  I KEY.FRAME.RECORD * +
  KEY.STATE.COUNT W!
  LOOP
  OBJECT.CHANGED ;


: INIT.WORLD.COLOR
  CURRENT.OBJECT @ >R
  OPERATION @ >R
  WORLD.OBJECT SET.CURRENT.OBJECT
  ^SET.OBJECT.COLOR.INDEX  OPERATION !
   TRAVERSE.DOWN.TREE
  R> OPERATION !
```

```
R> SET.CURRENT.OBJECT ;
```

```
\ Shading Utilities
\ updated 8.8.87 by Young Harvill
\ normalize, dot.product and shading changed to scale by
\ a full word. Compatible with new polygon algorithm

CR
." Loading shading utils... "

ANEW SHADES


( code for point handling  TO.STACK, FROM.STACK ) ( 012786 yh )

 : lwrap   23 + 24 wmod ;

CODE TO.STACK          ( THREE LONG VARS FROM ADDR. TO STACK )
      A0 GET,
      08 A0 I) PUT,
    04 A0 I) PUSH,
    A0 () PUSH,
    NEXT END-CODE


 CODE FROM.STACK         ( THREE LONG VARS FROM STACK TO ADDR )
      A0 POP,
      SP )+ A0 )+ LONG MOVE,
      SP )+ A0 )+ LONG MOVE,
      SP )+ A0 () LONG MOVE,
      NEXT END-CODE

   : TO.STACK,  ASSEMBLER
     A0 popoff,
     08 A0 I) PUSH,
     04 A0 I) PUSH,
     A0 () PUSH, ;



 \ ZCross.Product,
 \ finds only the z cross product for back-plane cull


  CODE ZCross.Product        \ QX QY QZ PX PY PZ
   SAVE.REGS
     03 SP@, D2 LONG MOVE,
     18 SP I) D2 MULS,       \ PxQy
     02 SP@, D3 LONG MOVE,
   22 SP I) D3 MULS,       \ PyQx
         D3  D2 LONG SUB,
       SP 08 LONG ADDQ,
     SP 08 LONG ADDQ,
     SP 08 LONG ADDQ,
         D2 PUSH,
    RESTORE.REGS
    NEXT END-CODE


 CODE SCALE.WITHIN            \ DEPTH NUMBER -- SCALES NUMBER ON STACK WITHIN DEPTH
   >R,
   SAVE.REGS
    D0 POP,              \ D0 = depth of stack
```

```
D1 POP,              \ d1 = maximum value
0 D2 MOVEQ,            \ d2 is greatest value
D1 1 LONG SUBQ,          \ test for zero count
PL IF,               \ if plus
 D1 D4 LONG MOVE,          \ d4 is first loop
 BEGIN,              \ start first loop
   D3 POP,            \ fetch the number
   D3 RPUSH,           \ save on return stack
   D3 ABS,            \ take absolute value
   D3 D2 LONG CMP, MI IF,     \ if greater than temp
     D3 D2 LONG MOVE,     \ save as temp
   THEN,
 D4 LOOP,             \ finish the loop
 0 D3 MOVEQ,
 BEGIN,              \ start scale test
   D2 D0 LONG CMP, MI IF,     \ if greater than limit
     D2 1 # LONG ASR,     \ scale
     D3 1 LONG ADDQ,      \ increment the count
   THEN,
 D2 D0 LONG CMP, PL UNTIL,      \ continue until in range
 BEGIN,              \ start scaling loop
   D2 RPOP,           \ pop the number
   D3 LONG TST, NE IF,        \ test the scale factor
     D2 D3 LONG ASR,      \ scale the number
   THEN,
   D2 PUSH,           \ push on stack
 D1 LOOP,             \ loop till done
THEN,
RESTORE.REGS
R>,
RTS, END-CODE


: SQRT,   ASSEMBLER
  D0 POP, 15 # D4 WORD MOVE,
 0 D1 MOVEQ, 0 D2 MOVEQ,
 BEGIN,
    D0 1 # LONG ASL,
   D1 1 # LONG ROXL,
    D0 1 # LONG ASL,
   D1 1 # LONG ROXL,
    D2 1 # LONG ASL,
   D2 D3 LONG MOVE,
    D3 1 # LONG ASL,
   D1 D3 LONG CMP,
    MI IF, D2 1 LONG ADDQ,
    D3 1 LONG ADDQ,
        D3 D1 LONG SUB,
   THEN,
   D4 WLOOP,
   D2 LONG EXT,
 D2 PUSH, ;


CODE NSQR
  >R,
  SQRT,
   R>, RTS,
   END-CODE


 CODE NSQRT
  SAVE.REGS
```

```
 ' nsqr 4- BSR,
 RESTORE.REGS
 NEXT END-CODE


\ NORMALIZE
\ takes the three-space vector x y z and scales it so that the length of
\ the vector is constant. Scales to hex 10000


\ NORMALIZE UTIL , IF.SCALE, OVER.CHECK


( NORMALIZE UTIL, XYZ.2,  DO/SP )                    ( 102785 YH )

: XYZ.2  ASSEMBLER      ( SQUARES X Y Z AND ADDS THEM / X Y Z N )
   D0 GET, 02 SP I) D0 MULS,            ( Z2 )
   02 SP@,  D1 LONG MOVE,
   06 SP I) D1 MULS,                    ( Y2)
   D1  D0 LONG ADD,                    ( D0 = Y2 + Z2 )
   03 SP@,  D1 LONG MOVE,
   10 SP I) D1 MULS,                    ( X2 )
   D1  D0 LONG ADD, D0 PUSH, ;         (  D0 = Y2 - Z2 - X2 , )

HEX


DECIMAL

( NORMALIZE UTIL, XYZ./SP )                          ( 102785 YH )

CODE  XYZ/SP  ASSEMBLER        \ SCALES AND DIVIDES XYZ BY TOP OF STACK
  >R,
   D2 GET,
   02 SP@, D1 LONG MOVE,      \  fix.div uses d0 as scratch
     D2 D1 FIX.DIV,
   D1 02 SP@, LONG MOVE,
   03 SP@, D1 LONG MOVE,
     D2 D1 FIX.DIV,
   D1 03 SP@, LONG MOVE,
   04 SP@, D1 LONG MOVE,
     D2 D1 FIX.DIV,
   D1 04 SP@, LONG MOVE,
  R>, RTS, END-CODE

                                                     ( 011038 YH )

( NORMALIZE / NORMALIZES VECTORS )                   ( 011038 YH )

 CODE NORMALIZE
       SAVE.REGS
      3 LIT,
      4096 LIT,
   ' SCALE.WITHIN 4- BSR,
       XYZ.2                         \ SQR AND ADD XYZ, / X Y X N
     ' nsqr 4- BSR,
```

```
  SP () LONG TST,  GT IF,         \ DIV BY 0 ?
    ' XYZ/SP 4 - BSR, ELSE,
     1 D1 MOVEQ,                  \ SCALE BY -HYP
     D1 02 SP@, LONG MOVE,        \ IF ZERO DIV
     D1 03 SP@, LONG MOVE,        \ PUSH ZEROS
     D1 04 SP@, LONG MOVE,
   THEN,  DROP,
  RESTORE.REGS
  NEXT END-CODE   ( RETURNS VECTORS SCALED BY 10000 hex -- X Y Z  )


CODE (NORMALIZE,)
      >R,
      3 LIT,
     4096 LIT,
   ' SCALE.WITHIN 4- BSR,
      XYZ.2                       \ SQR AND ADD XYZ, / X Y Z N
     ' nsqr 4- BSR,
     SP () LONG TST,  GT IF,      \ DIV BY 0 ?
       ' XYZ/SP 4 - BSR, ELSE,
        1 D1 MOVEQ,               \ SCALE BY -HYP
        D1 02 SP@, LONG MOVE,     \ IF ZERO DIV
        D1 03 SP@, LONG MOVE,     \ PUSH ZEROS
        D1 04 SP@, LONG MOVE,
      THEN,  DROP,
     R>,
     RTS, END-CODE   ( RETURNS VECTORS SCALED BY 10000 hex -- X Y Z  )




\ SET PLANE DIFF

\ sets the zslope relative to x and y from the normal vector
\ zscaling routines are used to scale the z value for the zbuffer


    : SET.HITHER.PLANE
    Z.LIMITS 4+ @
    10 + >R 0 0 R>
    UNPROJECT
    >R 2DROP R>
    ABS FIX.SCALE SCALE
    MIN HITHERPLANE ! ;

   : SET.YON.PLANE
    Z.LIMITS @ ABS
    FIX.SCALE SCALE MIN
    YONPLANE ! ;

    : SET.DEFAULT.CLIP.PLANE
    Z.LIMITS 4+ @
    10 + >R 0 0 R>
    UNPROJECT
    >R 2DROP R>
    ABS FIX.SCALE SCALE
      HITHERPLANE !
    Z.LIMITS @ ABS
    FIX.SCALE SCALE
    YONPLANE ! ;
```

```
: SET.ZSCALE
  DUP ZBUFF.SCALE !
  DUP ZERASE  SWAP SCALE Z.LIMITS !
      Z.BOUNDS SWAP SCALE
  NEG Z.LIMITS 4+ !
Z.LIMITS @ FIX.SCALE SCALE FIX.Z.LIMITS !
Z.LIMITS 4+ @ FIX.SCALE SCALE FIX.Z.LIMITS 4+ !
Z.LIMITS 4+ @
10 + >R 0 0 R>
UNPROJECT
>R 2DROP R>
ABS FIX.SCALE SCALE
HITHERPLANE !
Z.LIMITS @ ABS FIX.SCALE SCALE YONPLANE ! ;


: Z.SCALE, ASSEMBLER
  ZBUFF.SCALE A0 )#MOVE,
  A0 () D1 LONG MOVE,
  D1 LONG TST, PL IF,
    D0 D1 LONG ASR,
  ELSE,
  D1 LONG NEG,
  D0 D1 LONG ASL,
THEN, ;

: Z.UNSCALE,  ASSEMBLER
  ZBUFF.SCALE  A0 )#MOVE,
  A0 () D1 LONG MOVE,
D0 LONG EXT,
  D1 LONG TST, PL IF,
    D0 D1 LONG ASL,
  ELSE,
  D1 LONG NEG,
  D0 D1 LONG ASR,
THEN, ;

: LZ.UNSCALE,  ASSEMBLER
  ZBUFF.SCALE  A0 )#MOVE,
  A0 () D1 LONG MOVE,
  D1 LONG TST, PL IF,
    D0 D1 LONG ASL,
  ELSE,
  D1 LONG NEG,
  D0 D1 LONG ASR,
THEN, ;


CODE Z.UNSCALE D0 POP, Z.UNSCALE, D0 PUSH, NEXT END-CODE

CODE Z.SCALE D0 POP, Z.SCALE, D0 PUSH, NEXT END-CODE


\ DOT.PRODUCT
\ finds the simple angular diffence between two.vectors

hex

 : DOT.PRODUCT, ASSEMBLER    \ X Y Z 'X 'Y 'Z -- N DOT PRODUCT SCALED BY 10000 HEX
   D0 POP, D0 1 LONG SUBQ,
 D0 2 # LONG ASR,       \ DIVIDE ALL REGS BY TWO FOR
 D1 POP, D1 1 LONG SUBQ,
 D1 2 # LONG ASR,       \ USING SIGNED WORD MULTIPLICATION
```

```
D2 POP, D2 1 LONG SUBQ,
D2 2 # LONG ASR,
  D3 POP, D3 1 LONG SUBQ,
D3 2 # LONG ASR,
D4 POP, D4 1 LONG SUBQ,
D4 2 # LONG ASR,
D5 POP, D5 1 LONG SUBQ,
D5 2 # LONG ASR,
  D3 D0 MULS,          \ ' X * X
D4 D1 MULS,          \ ' Y * Y
D5 D2 MULS,          \ ' Z * Z
D2 D1 LONG ADD,        \  NX + NY
  D1 D0 LONG ADD,        \ D0 = NY + NX + NZ
D0 2 # LONG ASL,       \ SCALE BACK TO 3FFF
D0 SWAP,            \ LOW WORD IS NEW TERM
D0 LONG EXT,         \ EXTEND
D0 2 # LONG ASL,       \ SCALE BACK TO FFFF
D0 PUSH, ;           \ RETURN ON STACK

decimal

CODE DOT.PRODUCT
      SAVE.REGS
      DOT.PRODUCT,
      RESTORE.REGS
      NEXT END-CODE
```

```
\ POLYCREATES

ANEW --POLY.CREATES.BIG--
cr ." Loading Poly Creates..."

\ shading vars and constants


 12  CONSTANT 3POINT.LENGTH
 8 constant HITHER.SCALE

SMALL.DISPLAY NOT IFTRUE
  1024 CONSTANT SCAN.RECORD#  \ max number of bytes for scan width
    20 CONSTANT MAX.EDGES     \ maximum number of edges per scanline
IFEND

SMALL.DISPLAY IFTRUE
  512 CONSTANT SCAN.RECORD#   \ max number of bytes for scan width
  10 CONSTANT MAX.EDGES      \ maximum number of edges per scanline
IFEND


 0 CONSTANT Y.ADDRESS
 4 CONSTANT Z.ADDRESS
 8 CONSTANT X.BYTE
10 CONSTANT X.BIT
12 CONSTANT EDGE.COUNT
16 CONSTANT X.LINE
20 CONSTANT Z.LINE
24 CONSTANT X.START.SCAN
28 CONSTANT Z.SCALE.BASE
32 CONSTANT X.START.NORM
36 CONSTANT Y.START.NORM
40 CONSTANT X.END.SCAN
44 CONSTANT Z.END.BASE
48 CONSTANT X.END.NORM
52 CONSTANT Y.END.NORM

X.END.SCAN X.START.SCAN - CONSTANT EDGE.RECORD


X.START.SCAN MAX.EDGES EDGE.RECORD * -
CONSTANT SCAN.RECORD.LENGTH


  HEX
     CREATE     DITHER
     00000000 , 00000000 ,
     88000000 , 88000000 , 88002200 , 88002200 , AA002200 ,
     AA002200 , AA00AA00 , AA00AA00 , AA44AA00 , AA44AA00 ,
     AA44AA11 , AA44AA11 , AA55AA11 , AA55AA11 , AA55AA55 ,
     AA55AA55 , AADDAA55 , AADDAA55 , AADDAA77 , AADDAA77 ,
     AAFFAA77 , AAFFAA77 , AAFFAAFF , AAFFAAFF , EEFFAAFF ,
     EEFFAAFF , EEFFBBFF , EEFFBBFF , FFFFBBFF , FFFFBBFF ,
     FFFFFFFF , FFFFFFFF ,

  DECIMAL

 3POINT.LENGTH MAX.TYPE.POINTS * CONSTANT point.array.length

 \ clipping masks

  1 constant hitherclip
```

```
 2 constant yonclip
 4 constant topclip
 8 constant bottomclip
16 constant leftclip
32 constant rightclip


STRUCTURE RenderBlock
  Long: +PolyProc
  Long: +PolySelect
  Short: +PolyError
  Long: +scan.array
  Long: +(scan.array)
  Long: +Zbuffer
  Long: +^Zbuffer
  Long: +Zbufferx
  Long: +Zbuffery
  Long: +Obuffer
  Long: +^PolyBits
  Long: -PolyBits
  Long: +PolyRow
  Long: +polydepth
  Long: +CurrentBackport
    Long: +BackGDevice
  Long: +ObjectId
  Long: +Pat#         \ 0
  Long: +Pat          \ ptr to dither patterns
  Long: +LinePat
  Long: +Shade          \ DITHER  ,
  Long: +Brightness       \   7000 ,
  Long: +Brightness2      \
  Long: +ReflectOff       \
  Long: +TempRange      \
 3  Longs: +LightVector     \ direction of light
  Long: +ColorIndex
  Long: +KeyColorRes
 2 Longs: +AliasMask      \ 3, 1,
  Long: +Alias?         \ flag for aliasing
  Long: +YOffset
  Long: +XOffset
  Long: +YaliasOffset
  Long: +XaliasOffset
  Long: +Orthographic
  Long: +cdistance
    Long: +cdistint
 6  Longs: +cubebounds
  Long: +HitherPlane
  Long: +YonPlane
  Long: +LeftPlane
  Long: +RightPlane
  Long: +TopPlane
  Long: +BottomPlane
  Long: +polyclip?
  LONG: +CullBack? 0 ,
  Long: +zbuffscale
  Long: +ZYDiff
  Long: +ZXDiff
  Long: +TheBuffer
  Long: +TPolyYMin      \ redrawing bounds
  Long: +TPolyXMin      \ less than backport bounds
  Long: +TPolyYMax
  Long: +TPolyXMax
  Long: +PolyYMin       \ actual backport bounds
  Long: +PolyXMin
```

```
  Long: +PolyYMax        \ zbufferY
  Long: +PolyXMax        \ zbufferX
  Long: +ymaxscan        \ poly bounds
  Long: +ybasescan
  Long: +xmaxscan
  Long: +xbasescan
  Long: +ymapdiff
  Long: +xmapdiff
  Long: +xnormbase
  Long: +xnorminc
  Long: +ynormbase
  Long: +ynorminc
  Long: +mapbuff
12  Longs: -TempPoint1       \ current line points
12  Longs: +TempPoint2
  Long: +PolyPoints#      \ number of poly points

  point.array.length  Bytes: +PolyPoints
  point.array.length  Bytes: +ShadePoints
  point.array.length  Bytes: +TempShade
  point.array.length  Bytes: +NormalPoints
  point.array.length  Bytes: +TempNormalPoints
  Scan.record# 4*     Bytes: -ScanIndex

  256 Longs: +ReturnStackTop
  0 Bytes:   +PolyReturnStack
Structure.End

hex
  RenderBlock 7fff >
  iftrue ." RenderBlock is too large for word offset "
      abort
  ifend
decimal

 CREATE  PolyBlock  RenderBlock a..ot


 PolyBlock +scan.array    )constant ^SCAN.ARRAY
 PolyBlock +(scan.array)  )constant (^scan.array)
 PolyBlock +Zbuffer      )constant Zbuffer
 PolyBlock +^Zbuffer     )constant ^Zbuffer
 PolyBlock +Zbufferx     )constant Zbufferx
 PolyBlock +Zbuffery     )constant Zbuffery
 PolyBlock +Obuffer      )constant Obuffer
 PolyBlock -^PolyBits    )constant ^Poly.Bits
 PolyBlock +PolyBits     )constant Poly.Bits
 PolyBlock +PolyRow      )constant Poly.Row
 PolyBlock +polydepth    )constant Poly.Depth
 PolyBlock +CurrentBackport )constant Current.Backport
 PolyBlock +BackGDevice   )constant Back.GDevice
 PolyBlock +ObjectId     )constant OBJECT.ID
 PolyBlock +Pat#       )constant Pat#
 PolyBlock +Pat        )constant Pat
 PolyBlock +LinePat     )constant Line.Pat
 PolyBlock +ColorIndex    )constant COLOR.INDEX
 PolyBlock +KeyColorRes   )constant KEY.COLOR.RES
 PolyBlock +AliasMask     )constant Alias.Mask
 PolyBlock +Alias?       )constant Alias?
 PolyBlock +YOffset      )constant YOffset
 PolyBlock +XOffset      )constant XOffset
 PolyBlock +yaliasoffset  )constant YALIAS.OFFSET
 PolyBlock +xaliasoffset  )constant XALIAS.OFFSET
 PolyBlock +Orthographic  )constant Orthographic
```

```
PolyBlock +Cdistance      )constant CDistance
PolyBlock +CDistint     )constant CDistint
PolyBlock +cubebounds     )constant CUBE.BOUNDS
PolyBlock +cubebounds 16 + )constant ZCBOUNDS
PolyBlock +cubebounds  8 + )constant YCBOUNDS
PolyBlock +cubebounds       )constant XCBOUNDS
PolyBlock +hitherplane   )constant hitherplane
PolyBlock +yonplane    )constant YonPlane
PolyBlock +rightplane      )constant rightplane
PolyBlock +leftplane     )constant leftPlane
PolyBlock +topplane    )constant topplane
PolyBlock +bottomplane   )constant bottomPlane
PolyBlock +polyclip?   )constant polyclip?
PolyBlock +CullBack?   )constant Cull.Back?
PolyBlock +zbuffscale    )constant Zbuff.Scale
PolyBlock +ZYDiff      )constant Zdiffs
PolyBlock +ZYDiff      )constant ZYDIFF
PolyBlock +ZYDiff  4+     )constant ZXDIFF
PolyBlock +TheBuffer      )constant The.Buffer
PolyBlock +tpolyymin      )constant TPOLY.YMIN
PolyBlock +tpolyxmin      )constant TPOLY.XMIN
PolyBlock +tpolyymax      )constant TPOLY.YMAX
PolyBlock +tpolyxmax      )constant TPOLY.XMAX
PolyBlock +polyymin       )constant POLY.YMIN
PolyBlock +polyxmin       )constant POLY.XMIN
PolyBlock +polyymax       )constant POLY.YMAX
PolyBlock +polyxmax       )constant POLY.XMAX
PolyBlock +ymaxscan    )constant YMAXSCAN
PolyBlock +ybasescan      )constant YBASESCAN
PolyBlock +xmaxscan    )constant XMAXSCAN
PolyBlock +xbasescan      )constant XBASESCAN
PolyBlock +TempPoint1     )constant TEMP.POINT1
PolyBlock +TempPoint2     )constant TEMP.POINT2
PolyBlock +PolyPoints#    )constant #POLY.POINTS
PolyBlock +PolyPoints     )constant POLY.POINTS
PolyBlock +ShadePoints    )constant SHADE.POINTS
PolyBlock +TempShade      )constant TEMP.SHADE
PolyBlock +NormalPoints  )constant NORMAL.POINTS
PolyBlock +TempNormalPoints  )constant TempNormal.Points
PolyBlock +ScanIndex      )constant SCAN.INDEX

\ set defaults other than zero


: InitPolyBlock
  locals| thepolyblock
  thepolyblock  renderblock erase
   1  thepolyblock +objectid !
   3  thepolyblock +aliasmask  !
   1  thepolyblock +aliasmask 4+ !
   4  thepolyblock +polypoints# !
 28672 thepolyblock +BRIGHTNESS !
 300  10 scale thepolyblock +hitherplane !
 120  10 scale thepolyblock +yonplane !
-120  10 scale thepolyblock +Leftplane !
 120  10 scale thepolyblock +Rightplane !
-120  10 scale thepolyblock +TopPlane !
 120  10 scale thepolyblock +BottomPlane !
 400  10 scale thepolyblock +CDistance !
 400  thepolyblock +CDistint !
    scan.record#  0 do
      i  scan.record# 1 - > if
```

```
      scan.record#
  else i
  then
    scan.record.length *
    thepolyblock +scanindex i 4* + !
  loop ;

polyblock InitPolyBlock

: RESTORE.POLY.REGS  ASSEMBLER          \ restores regs from poly calls
 RP )+ REGLIST D3-D7/A2/A4/A6 LONG MOVEM,
 RP () RP LONG MOVE,  ;

: SAVE.POLY.REGS    ASSEMBLER
 RP PUSH,
 POLYBLOCK A0 )#MOVE,              \ save the return stack
 A0 RP LONG MOVE,
 0 +PolyReturnStack # RP LONG ADDA,       \ set new return stack
 SP )+ RP -) long move,              \ save old r stack on new
 A0 PUSH,
 REGLIST D3-D7/A2/A4/A6 RP -)  LONG MOVEM,
 A6 POP, ;

: PBMove,  assembler
 locals| reg1 reg2 off |
 off A6 I) REG2 REG1 LONG LEA, ;
```

```
\ Polygon Drawing
\ Last Revision: 02/25/88  11:03:39 AM   YH
\  uses a scanline bucket sort
\  draws complex  polygons
\ to byte zbuffer and byte object id buffer


ANEW NEW.POLY

 cr ." Loading polygon drawing utils..."

\ polygon fill and zbuffer utils  Last Revision: 02/25/88  11:04:18 AM   YH
\ added multiple edges per scanline for complex poly draw

8323072 CONSTANT ZBASE.DEFAULT
SCAN.RECORD#   CONSTANT XBASE.DEFAULT


 PROC.START

 CODE   SET.DIFFS              \ ^3point ^3point -- writes scan.array
    >R,
    0 +TempPoint1  A0 PBMove,
    0 +TempPoint2  A1 PBMove,
    A2 POP,
      A2 ()    A0 () LONG MOVE,       \ move poly points to temp points
    4 A2 I) 4 A0 I) LONG MOVE,
    8 A2 I) 8 A0 I) LONG MOVE,
    A2 POP,
      A2 ()    A1 () LONG MOVE,
    4 A2 I) 4 A1 I) LONG MOVE,
    8 A2 I) 8 A1 I) LONG MOVE,
        4 A0 I) D0 LONG MOVE,
        4 A1 I) D0 LONG CMP,         \ compare y value of points
    MI IF,
       A1 A0 EXG,              \ exchange if a1 is greater
    THEN,
    A0 A4 LONG MOVE,
      4 A0 I) D4 LONG MOVE,
    4 A1 I) D4 LONG SUB,        \ d4 is ydiff
    8 A0 I) D3 LONG MOVE,
    8 A1 I) D3 LONG SUB,          \ d3 is xdiff

 \ CALC.X.SLOPE
     D3 D1 LONG MOVE,           \ d1 is xdiff
     D4 D1 FIX.DIV,             \ xdif / ydiff ,  d0 is scratch for fix div
       D1 D5 LONG MOVE,              \ d5 is xslope

 \ CALC.Z.SLOPE
     A0 () D3 LONG MOVE,
     A1 () D3 LONG SUB,           \ d3 is zdiff
     D3 D1 LONG MOVE,           \ d4 is ydiff
     D4 D1 FIX.DIV,             \ zdif / ydiff , d0 is scratch for fix.div
         D1 D6 LONG MOVE,             \ d6 is zslope
     R>,
     RTS, END-CODE

   PROC.END

    decimal


 \ NEW EDGE WRITING ROUTINE FOR COMPLEX POLYS
```

```
hex

PROC.START

CODE SET.WRITE.VARS
   >R,
   \ SET Y SCREEN ADDRESS
   4 A1 I) D7 LONG MOVE,            \ d7 = ymin
   4 A0 I) D4 LONG MOVE,            \ d4 = ymax
   D7 D4 LONG SUB,             \ d4 = ydiff
       D7 D0 LONG MOVE,            \ D0 = ymin
   0 +ScanIndex A2 PBMove,
   D0 SCAN.RECORD# 1- WORD ANDI,
       D0 2 # WORD ASL,
   D0 0 WORD A2 @I) D7 LONG MOVE,       \ d7 is offset to scan array
   0 +scan.array A6 I) A2 LONG MOVE,     \ a2 is scan array address
   D7 A2 LONG ADDA,             \ Now a2 is base of current record
   8 A1 I) D3 LONG MOVE,            \ d3 = xbase
   D3 SWAP,                 \ d3 = scaled xbase
   0 # D3 WORD MOVE,              \ clear low word
   A1 () D2 LONG MOVE,             \ d2 = zbase
   D2 SWAP,                 \ d2 = scaled zbase
   0 # D2 WORD MOVE,              \ clear low word
   0 D7 MOVEQ,               \ d7 is index to current edge
 R>, RTS, END-CODE

 PROC.END

\ register variables for writing line to scan array

\  d0 = temp
\  d1 = free
\  d2 = scaled zbase
\  d3 = scaled xbase
\  d4 = ydiff
\  d5 = xslope
\  d6 = zslope
\  d7 = array y index
\  a2 = array pointer
\  a1 = free
\  a0 = free


 PROC.START

 CODE SET.ALIAS.WRITE.VARS
    >R,
    4 A1 I) D7 LONG MOVE,            \ d7 = ymin
    4 A0 I) D4 LONG MOVE,             d4   ymax
    A0 PUSH,
      D7 D0 LONG MOVE,
      D0 3 LONG ANDI,
      0 +AliasMask A0 PBMove,
      D0 4 A0 I) LONG MOVE,          \ set the alias mask
    A0 POP,
    D4 2 # LONG ASR,             \ scale down max y
    D7 2 # LONG ASR,             \ scale down min y
    D7 D4 LONG SUB,              \ d4 = ydiff
        D7 D0 LONG MOVE,            \ D0 = ymin
    0 +ScanIndex A2 PBMove,
    D0 SCAN.RECORD# 1- WORD ANDI,
        D0 2 # WORD ASL,
```

```
  DO 0 WORD A2 @I) D7 LONG MOVE,          \ d7 is offset to scan array
  0 +scan.array A0 PBMove,
  A0 () A2 LONG MOVE,            \ a2 is scan array address
  D7 A2 LONG ADDA,             \ Now a2 is base of current record
  0 D7 MOVEQ,                \ d7 is index to current edge
  8 A1 I) D3 LONG MOVE,           \ d3 = xbase
  D3 SWAP,                \ d3 = scaled xbase
  0 # D3 WORD MOVE,            \ clear low word
  A1 () D2 LONG MOVE,           \ d2 = zbase
  D2 SWAP,                \ d2 = scaled zbase
  0 # D2 WORD MOVE,            \ clear low word
 R>, RTS, END-CODE

 PROC.END

decimal



DECIMAL


: SORT.SCAN.ARRAY ASSEMBLER                \ sorts new edge entry into edge table
  SCAN.RECORD.LENGTH # A2 LONG ADDA,            \ preincrement, scan starts at one
  EDGE.COUNT  A2 I) D7 LONG MOVE,             \ d7 is index into array of edges
  D7 MAX.EDGES EDGE.RECORD * EDGE.RECORD 1- -
  LONG CMPI, MI IF,                   \ tests the last acceptable count
    DO  D7 X.START.SCAN WORD A2 @I) LONG MOVE,       \ move thisx to startx
       D2  D7 Z.SCALE.BASE WORD A2 @I) LONG MOVE,       \ move this z to startz
    D7 EDGE.RECORD LONG SUBI,              \ loop +EDGE.RECORD
    PL IF,
      BEGIN,                 \ start the loop
        D7 X.START.SCAN WORD A2 @I) DO LONG CMP,    \ compare this x with last
        MI IF,                \ if last > this then ....
            D7 X.START.SCAN WORD A2 @I)
            D7 X.END.SCAN   WORD A2 @I) LONG MOVE,    \ move startx to endx
          D7 Z.SCALE.BASE WORD A2 @I)
          D7 Z.END.BASE WORD A2 @I) LONG MOVE,    \ move startz to endz

          DO  D7 X.START.SCAN WORD A2 @I) LONG MOVE,  \ move thisx to startx
              D2  D7 Z.SCALE.BASE WORD A2 @I) LONG MOVE,  \ move this z to startz
        ELSE,
          0 D7 MOVEQ,              \ and stop
        THEN,
        D7 EDGE.RECORD LONG SUBI,           \ loop -EDGE.RECORD
      MI  UNTIL,
    THEN,
  EDGE.COUNT  A2 I) EDGE.RECORD  LONG ADDI,        \ increment edge count
  THEN,
  DO   X.LINE  A2 I) LONG MOVE,            \ write to x line
    D2   Z.LINE  A2 I) LONG MOVE,
  ;                          \ write to z line



 PROC.START

 CODE WRITE.EDGE                   \ writes line to scan array
    >R,
    D4 1 LONG SUBQ,                \ check loop for zero
    PL IF.L,
```

```
      D3 D0 LONG MOVE,
      D0 SWAP,
      D0 LONG EXT,
      SORT.SCAN.ARRAY              \ write to the scan array
      D5 D3 LONG ADD,              \ increment x
      D6 D2 LONG ADD,              \ increment zbase by zslope
     D4 1 LONG SUBQ,               \ decrement loop, check for zero
       PL IF,
        BEGIN,
        D3 D0 LONG MOVE,
        D0 SWAP,
        D0 LONG EXT,
        SORT.SCAN.ARRAY            \ write to the scan array
        D5 D3 LONG ADD,            \ increment x
        D6 D2 LONG ADD,            \ increment zbase by zslope
        D4 LOOP,                 \ repeat till done
    THEN,
      D3 D0 LONG MOVE,
    D0 SWAP,
    D0 LONG EXT,
    SCAN.RECORD.LENGTH # A2 LONG ADDA,        \ preincrement, scan starts at one
    D0    X.LINE  A2 I) LONG MOVE,
      D2    Z.LINE  A2 I) LONG MOVE,
  THEN,
R>, RTS, END-CODE

PROC.END


PROC.START

CODE WRITE.ALIAS.EDGE                    \ writes line to scan array
   >R,
   D4 1 LONG SUBQ,              \ check loop for zero
   PL IF.L,

      D3 D0 LONG MOVE,
      D0 SWAP,
      D0 LONG EXT,
      D0 PUSH,
      D2 PUSH,                  \ save the regs
      D2 2 # LONG ASR,              \ scale for a write
      D0 2 # LONG ASR,
      SORT.SCAN.ARRAY               \ write to the scan array
      D2 POP, D0 POP,
      D5 D3 LONG ADD,               \ increment x for roundoff
      D6 D2 LONG ADD,               \ increment z for roundoff
      A0 PUSH,
      0 +AliasMask A0 PBMove,           \ fetch mask
      4 A0 I) D0 LONG MOVE,
      D0 1 LONG SUBQ,
      PL IF,
        BEGIN,
          D5 D3 LONG SUB,           \ increment x
          D6 D2 LONG SUB,           \ increment z
        D0 LOOP,
      THEN,
      A0 POP,
      D5 2 # LONG ASL,              \ scale up the increments
      D6 2 # LONG ASL,
      D5 D3 LONG ADD,               \ increment x
      D6 D2 LONG ADD,               \ increment z
     D4 1 LONG SUBQ,                \ decrement loop, check for zero
       PL IF,
```

```
      BEGIN,
       D3 D0 LONG MOVE,              \ do is temp xbase
       D0 SWAP,
       D0 LONG EXT,
       D0 PUSH, D2 PUSH,
       D2 2 # LONG ASR,
       D0 2 # LONG ASR,
      SORT.SCAN.ARRAY              \ write to the scan array
      D2 POP, D0 POP,
      D5 D3 LONG ADD,                \ increment x
      D6 D2 LONG ADD,              \ increment z
    D4 LOOP,                   \ repeat till done
  THEN,
  A4 () D2 LONG MOVE,                 \ A4 is second point
  D2 SWAP,
  0 # D2 WORD MOVE,
  8 A4 I) D3 LONG MOVE,
  D3 SWAP,
  0 # D3 WORD MOVE,
  D3 SWAP,
  D3 D0 WORD MOVE,                \ do is temp xbase
  D0 LONG EXT,
  D3 SWAP,
  D2 2 # LONG ASR,
  D0 2 # LONG ASR,
  SCAN.RECORD.LENGTH # A2 LONG ADDA,        \ preincrement, scan starts at one
  D0    X.LINE  A2 I) LONG MOVE,
    D2    Z.LINE  A2 I) LONG MOVE,
 THEN,
R>, RTS, END-CODE

PROC.END


PROC.START

CODE (SCAN.EDGE.IN)
 >R,
   ' SET.DIFFS      4- BSR,
   ' SET.WRITE.VARS  4- BSR,
   ' WRITE.EDGE     4- BSR,
 R>,
 RTS, END-CODE

 PROC.END


 PROC.START

CODE RESTORE.POLY.POINTS
   >R, A0 RPUSH,
     D0 RPUSH,
     0 +TempPoint1 A0 PBMove,
     A0 () D0 LONG MOVE,
     D0 2 # LONG ASR,
     D0 A0 () LONG MOVE,
     4 A0 I) D0 LONG MOVE,
     D0 2 # LONG ASR,
     D0 4 A0 I) LONG MOVE,
     8 A0 I) D0 LONG MOVE,
     D0 2 # LONG ASR,
     D0 8 A0 I) LONG MOVE,
     0 +TempPoint2 A0 PBMove,
```

```
    A0 () D0 LONG MOVE,
    D0 2 # LONG ASR,
    D0 A0 () LONG MOVE,
    4 A0 I) D0 LONG MOVE,
    D0 2 # LONG ASR,
    D0 4 A0 I) LONG MOVE,
    8 A0 I) D0 LONG MOVE,
    D0 2 # LONG ASR,
    D0 8 A0 I) LONG MOVE,
    D0 RPOP,
    A0 RPOP,
  R>,
  RTS, END-CODE

PROC.END


PROC.START

CODE (SCAN.ALIAS.EDGE.IN)
 >R,
   0 +PolyYMax A0 PBMove,
   A0 () D0 LONG MOVE,
   D0 2 # LONG ASL,
   D0 A0 () LONG MOVE,
   0 +PolyXMax A0 PBMove,
   A0 () D0 LONG MOVE,
   D0 2 # LONG ASL,
   D0 A0 () LONG MOVE,
   ' SET.DIFFS        4- BSR,
   ' SET.ALIAS.WRITE.VARS  4- BSR,
   ' WRITE.ALIAS.EDGE     4- BSR,
   ' RESTORE.POLY.POINTS   4- BSR,
   0 +PolyYMax A0 PBMove,
   A0 () D0 LONG MOVE,
   D0 2 # LONG ASR,
   D0 A0 () LONG MOVE,
   0 +PolyXMax A0 PBMove,
   A0 () D0 LONG MOVE,
   D0 2 # LONG ASR,
   D0 A0 () LONG MOVE,
 R>,
 RTS, END-CODE

 PROC.END


PROC.START

CODE (CLEAR.LINE.SCAN)
 >R,
 0 +YMAXSCAN A6  I) D7 LONG MOVE,
 0 +YBASESCAN A6 I) D0 LONG MOVE,
  D0 1 LONG SUBQ, MI IF,
   0 D0 MOVEQ,
  THEN,
  D7 1 LONG ADDQ,
  D7 SCAN.RECORD#  LONG CMPI, PL IF,
   SCAN.RECORD# # D7 LONG MOVE,
  THEN,
  D0 D7 LONG SUB,
  0 +ScanIndex A0 PBMove,           \ a0 is scan.index
  D0 2 # LONG ASL,                \ d6 is y *2
  D0 0 WORD A0 @I) D0 LONG MOVE,       \ d5 is y index,
```

```
 0 +scan.array A0 PBMove,
 A0 () A0 LONG MOVE,
 D0 A0 LONG ADDA,
 D7 01 LONG SUBQ, PL IF,
 XBASE.DEFAULT #  D0 LONG MOVE,
 ZBASE.DEFAULT #  D1 LONG MOVE,
 0 D2 MOVEQ,
BEGIN,
  D2 EDGE.COUNT A0 I) LONG MOVE,
  D0 X.LINE  A0 I) LONG MOVE,
  D1 Z.LINE  A0 I) LONG MOVE,
  SCAN.RECORD.LENGTH # A0 LONG ADDA,
D7 LOOP,.
THEN,
R>,
RTS, END-CODE

PROC.END


PROC.START

CODE (SCAN.ALL.EDGES)                   \ write scanarray for all lines
   >R,
   ' (CLEAR.LINE.SCAN) 4- BSR,            \ clear the line scan
   0 +POLYPOINTS# A0 PBMOVE,
   A0 () D1 LONG MOVE,
   D1 2 LONG SUBQ, PL IF,
     0 +POLYPOINTS A1 PBMove,
     BEGIN,
       D1 PUSH,                  \ save the loop
       A1 PUSH,                  \ save the pointer
       A1 PUSH,                  \ args for edge scan
       12 # A1 LONG ADDA,              \ polypointer, and - 12
       A1 PUSH,
       0 +Alias? A0 PBMove,
       A0 () LONG TST,
       EQ IF,
         ' (SCAN.EDGE.IN)     4- BSR,    \ do the scan
       ELSE,
         ' (SCAN.ALIAS.EDGE.IN)  4- BSR,
       THEN,
       A1 POP,                   \ restore the pointer
       D1 POP,                   \ restore the loop
       12 # A1 LONG ADDA,              \ inc the pointer
     D1 LOOP,
     A1 PUSH,                    \ push current polypointer
     0 +POLYPOINTS A1 PBMove,
     A1 PUSH,                    \ push start point
     0 +Alias? A0 PBMove,
     A0 () LONG TST,
     EQ IF,
       ' (SCAN.EDGE.IN)     4- BSR,    \ do the scan
     ELSE,
       ' (SCAN.ALIAS.EDGE.IN)  4- BSR,
     THEN,
   THEN,
   R>,
   RTS, END-CODE

 PROC.END
```

```
\ Polygon Map Drawing

anew -polymap--

 PROC.START

 CODE   SET.MAP.DIFFS            \ ^3point ^3point -- writes scan.array
    >R,
    0 +TempPoint1  A0 PBMove,
    0 +TempPoint2  A1 PBMove,
    A2 POP,
      A2 ()    A0 () LONG MOVE,        \ move poly points to temp points
    4 A2 I) 4 A0 I) LONG MOVE,
    8 A2 I) 8 A0 I) LONG MOVE,

    0 +normalpoints 0 +polypoints -
      A2 I) 12 A0 I) LONG MOVE,
    4 +normalpoints 0 +polypoints -
      A2 I) 16 A0 I) LONG MOVE,

    A2 POP,
      A2 ()    A1 () LONG MOVE,
    4 A2 I) 4 A1 I) LONG MOVE,
    8 A2 I) 8 A1 I) LONG MOVE,

    0 +normalpoints 0 +polypoints -
      A2 I) 12 A1 I) LONG MOVE,
    4 +normalpoints 0 +polypoints -
      A2 I) 16 A1 I) LONG MOVE,

        4 A0 I) D0 LONG MOVE,
        4 A1 I) D0 LONG CMP,         \ compare y value of points
    MI IF,
       A1 A0 EXG,            \ exchange if a1 is greater
    THEN,
    A0 A4 LONG MOVE,
      4 A0 I) D4 LONG MOVE,
    4 A1 I) D4 LONG SUB,         \ d4 is ydiff
    8 A0 I) D3 LONG MOVE,
    8 A1 I) D3 LONG SUB,           \ d3 is xdiff

 \ CALC.X.SLOPE
    D3 D1 LONG MOVE,           \ d1 is xdiff
    D4 D1 FIX.DIV,             \ xdif / ydiff ,  d0 is scratch for fix div
      D1 D5 LONG MOVE,             \ d5 is xslope

 \ CALC.X.NORM
    12 A0 I) D3 LONG MOVE,
    12 A1 I) D3 LONG SUB,          \ d3 is diff
    D3 D1 LONG MOVE,           \ d4 is ydiff
    D4 D1 FIX.DIV,             \ dif / ydiff , d0 is scratch for fix.div
        D1 0 +xnorminc A6 I) LONG MOVE,    \ set -norminc
    12 A1 I) D2 LONG MOVE,         \
    D2 SWAP,              \ d2 = scaled zbase
    0 # D2 WORD MOVE,           \ clear low word
    d2 0 +xnormbase A6 I) LONG MOVE,  \ set  xnormbase

 \ CALC.Y.NORM
    16 A0 I) D3 LONG MOVE,
    16 A1 I) D3 LONG SUB,          \ d3 is diff
    D3 D1 LONG MOVE,           \ d4 is ydiff
    D4 D1 FIX.DIV,             \ dif / ydiff , d0 is scratch for fix.div
        D1 0 +ynorminc A6 I) LONG MOVE,    \ set ynorminc
    16 A1 I) D2 LONG MOVE,
```

```
    D2 SWAP,                \ d2 = scaled zbase
    0 # D2 WORD MOVE,             \ clear low word
    d2 0 +ynormbase A6 I) LONG MOVE,  \ set  ynormbase

\ CALC.Z.SLOPE
    A0 () D3 LONG MOVE,
    A1 () D3 LONG SUB,            \ d3 is zdiff
    D3 D1 LONG MOVE,            \ d4 is ydiff
    D4 D1 FIX.DIV,              \ zdif / ydiff , d0 is scratch for fix.div
        D1 D6 LONG MOVE,           \ d6 = zinc

    R>,
    RTS, END-CODE

  PROC.END

   decimal


\ NEW EDGE WRITING ROUTINE FOR COMPLEX POLYS


  hex

  PROC.START

 CODE SET.MAP.VARS
    >R,
    \ SET Y SCREEN ADDRESS
    4 A1 I) D7 LONG MOVE,            \ d7 = ymin
    4 A0 I) D4 LONG MOVE,            \ d4 = ymax
    D7 D4 LONG SUB,              \ d4 = ydiff
        D7 D0 LONG MOVE,             \ D0 = ymin
    0 +ScanIndex A2 PBMove,
    D0 SCAN.RECORD# 1- WORD ANDI,
        D0 2 # WORD ASL,
    D0 0 WORD A2 @I) D7 LONG MOVE,       \ d7 is offset to scan array
    0 -scan.array A6 I) A2 LONG MOVE,      \ a2 is scan array address
    D7 A2 LONG ADDA,              \ Now a2 is base of current record
    8 A1 I) D3 LONG MOVE,            \ d3 = xbase
    D3 SWAP,                \ d3 = scaled xbase
    0 # D3 WORD MOVE,             \ clear low word
    0 D7 MOVEQ,               \ d7 is index to current edge
    A1 () D2 LONG MOVE,            \ d2 = zbase
    D2 SWAP,                \ d2 = scaled zbase
    0 # D2 WORD MOVE,             \ clear low word
  R>, RTS, END-CODE

  PROC.END

\ register variables for writing line to scan array

\  d0 = temp
\  d1 = free
\  d2 = scaled zbase
\  d3 = scaled xbase
\  d4 = ydiff
\  d5 = xslope
\  d6 = zslope
\  d7 = array y index
\  a2 = array pointer
\  a1 = free
\  a0 = free
```

```
PROC.START

CODE SET.AMAP.VARS
   >R,
   4 A1 I) D7 LONG MOVE,          \ d7 = ymin
   4 A0 I) D4 LONG MOVE,          \ d4 = ymax
   A0 PUSH,
     D7 D0 LONG MOVE,
     D0 3 LONG ANDI,
     0 +AliasMask A0 PBMove,
     D0 4 A0 I) LONG MOVE,        \ set the alias mask
   A0 POP,
   D4 2 # LONG ASR,            \ scale down max y
   D7 2 # LONG ASR,            \ scale down min y
   D7 D4 LONG SUB,             \ d4 = ydiff
       D7 D0 LONG MOVE,          \ D0 = ymin
   0 +ScanIndex A2 PBMove,
   D0 SCAN.RECORD# 1- WORD ANDI,
       D0 2 # WORD ASL,
   D0 0 WORD A2 @I) D7 LONG MOVE,      \ d7 is offset to scan array
   0 +scan.array A0 PBMove,
   A0 () A2 LONG MOVE,            \ a2 is scan array address
   D7 A2 LONG ADDA,            \ Now a2 is base of current record
   0 D7 MOVEQ,              \ d7 is index to current edge
   8 A1 I) D3 LONG MOVE,            \ d3 = xbase
   D3 SWAP,               \ d3 = scaled xbase
   0 # D3 WORD MOVE,            \ clear low word
   A1 () D2 LONG MOVE,           \ d2 - zbase
   D2 SWAP,               \ d2 - scaled zbase
   0 # D2 WORD MOVE,            \ clear low word
  R>, RTS, END-CODE

  PROC.END

 decimal



DECIMAL


: SORT.MAP.ARRAY ASSEMBLER                  \ sorts new edge entry into edge table
  SCAN.RECORD.LENGTH # A2 LONG ADDA,              \ preincrement, scan starts at one
  EDGE.COUNT  A2 I) D7 LONG MOVE,              \ d7 is index into array of edges
  D7 MAX.EDGES EDGE.RECORD * EDGE.RECORD 1- -
  LONG CMPI, MI IF,                  \ tests the last acceptable count
    D1 8 # LONG ASL,
    D3  D7 X.START.SCAN WORD A2 @I) LONG MOVE,        \ move thisx to startx
        D2  D7 Z.SCALE.BASE WORD A2 @I) LONG MOVE,        \ move this z to startz
        D0  D7 X.START.NORM WORD A2 @I) LONG MOVE,        \ move this NORMX to start
        D1  D7 Y.START.NORM WORD A2 @I) LONG MOVE,        \ move this NORMY to start

    D7 EDGE.RECORD LONG SUBI,                 \ loop -EDGE.RECORD
    PL IF,
      BEGIN,                   \ start the loop
        D7 X.START.SCAN WORD A2 @I) D3 LONG CMP,     \ compare this x with last
        MI IF,                 \ if last > this then ....
            D7 X.START.SCAN WORD A2 @I)
            D7 X.END.SCAN   WORD A2 @I) LONG MOVE,     \ move startx to endx
          D7 Z.SCALE.BASE WORD A2 @I)
          D7 Z.END.BASE WORD A2 @I) LONG MOVE,     \ move startz to endz
```

```
        D7 X.START.NORM WORD A2 @I)
        D7 X.END.NORM WORD A2 @I) LONG MOVE,     \ move xnormstart to end
        D7 Y.START.NORM WORD A2 @I)
        D7 Y.END.NORM WORD A2 @I) LONG MOVE,     \ move ynormstart to end

        D3  D7 X.START.SCAN WORD A2 @I) LONG MOVE,  \ move thisx to startx
            D2  D7 Z.SCALE.BASE WORD A2 @I) LONG MOVE,  \ move this z to startz
            D0  D7 X.START.NORM WORD A2 @I) LONG MOVE,  \ move this NORMX to start
            D1  D7 Y.START.NORM WORD A2 @I) LONG MOVE,  \ move this NORMY to start

      ELSE,
        0 D7 MOVEQ,                  \ and stop
      THEN,
      D7 EDGE.RECORD LONG SUBI,              \ loop +EDGE.RECORD
    MI  UNTIL,
  THEN,
 EDGE.COUNT  A2 I) EDGE.RECORD  LONG ADDI,         \ increment edge count
 THEN,
 ;                              \ no line for phong


PROC.START

CODE WRITE.MAP.EDGE                     \ writes line to scan array
   >R,
   D4 1 LONG SUBQ,              \ check loop for zero
   PL IF.L,
      D3 PUSH,
      D3 SWAP,
      D3 LONG EXT,
      0 +XNORMBASE A6 I) D0 LONG MOVE,
      0 +YNORMBASE A6 I) D1 LONG MOVE,       \ save the regs
      SORT.MAP.ARRAY             \ write to the scan array
      D3 POP,
      D5 D3 LONG ADD,            \ increment x
      D6 D2 LONG ADD,            \ increment z

      0 +XNORMINC A6 I) d1 LONG MOVE,
      d1 0 +XNORMBASE A6 I) LONG ADD,

      0 +YNORMINC A6 I) d1 LONG MOVE,
      d1 0 +YNORMBASE A6 I) LONG ADD,

     D4 1 LONG SUBQ,             \ decrement loop, check for zero
       PL IF.L,
        BEGIN,
        D3 PUSH,
        D3 SWAP,
        D3 LONG EXT,
        0 +XNORMBASE A6 I) D0 LONG MOVE,
        0 +YNORMBASE A6 I) D1 LONG MOVE,      \ save the regs
        SORT.MAP.ARRAY              \ write to the scan array
        D3 POP,
        D5 D3 LONG ADD,             \ increment x
        D6 D2 LONG ADD,             \ increment z

        0 +XNORMINC A6 I) d1 LONG MOVE,
        d1 0 +XNORMBASE A6 I) LONG ADD,

        0 +YNORMINC A6 I) d1 LONG MOVE,
        d1 0 +YNORMBASE A6 I) LONG ADD,

      D4 LOOP,                  \ repeat till done
      THEN,
```

```
  THEN,
R>, RTS, END-CODE

PROC.END


PROC.START

CODE WRITE.AMAP.EDGE                        \ writes line to scan array
   >R,
   D4 1 LONG SUBQ,                   \ check loop for zero
   PL IF.L,

       D3 PUSH,
       D3 SWAP,
       D3 LONG EXT,
       D2 PUSH,
         0 +XNORMBASE A6 I) D0 LONG MOVE,
       0 +YNORMBASE A6 I) D1 LONG MOVE,      \ save the regs
       D0 2 # LONG ASR,
       D1 2 # LONG ASR,
       D2 2 # LONG ASR,               \ scale for a write
       D3 2 # LONG ASR,
       SORT.MAP.ARRAY                 \ write to the scan array
       D2 POP,
       D3 POP,
       D5 D3 LONG ADD,                \ increment x for roundoff
       D6 D2 LONG ADD,                \ increment z for roundoff

       0 +XNORMINC A6 I) D1 LONG MOVE,
       D1 0 +XNORMBASE A6 I) LONG ADD,
       0 +YNORMINC A6 I) D1 LONG MOVE,
       D1 0 +YNORMBASE A6 I) LONG ADD,

       A0 PUSH,
       0 +AliasMask A0 PBMove,           \ fetch mask
       4 A0 I) D0 LONG MOVE,
       D0 1 LONG SUBQ,
       PL IF,
         BEGIN,
           D5 D3 LONG SUB,            \ increment x
           D6 D2 LONG SUB,            \ increment z
           0 +XNORMINC A6 I) D1 LONG MOVE,    \ increment normals
           D1 0 +XNORMBASE A6 I) LONG SUB,
           0 +YNORMINC A6 I) D1 LONG MOVE,
           D1 0 +YNORMBASE A6 I) LONG SUB,
         D0 LOOP,
       THEN,
       A0 POP,

       D5 2 # LONG ASL,               \ scale up the increments
       D6 2 # LONG ASL,
       0 +XNORMINC A6 I) D0 LONG MOVE,
       D0 2 # LONG ASL,
       D0 0 +XNORMINC A6 I) LONG MOVE,       \ scale the normal increments
       0 +YNORMINC A6 I) D0 LONG MOVE,
       D0 2 # LONG ASL,
       D0 0 +YNORMINC A6 I) LONG MOVE,       \ scale the normal increments

       D5 D3 LONG ADD,                \ increment x
       D6 D2 LONG ADD,                \ increment z

       0 +XNORMINC A6 I) D1 LONG MOVE,
       D1 0 +XNORMBASE A6 I) LONG ADD,
```

```
    0 +YNORMINC A6 I) D1 LONG MOVE,
    D1 0 +YNORMBASE A6 I) LONG ADD,

   D4 1 LONG SUBQ,                \ decrement loop, check for zero
     PL IF.L,
      BEGIN,
        D3 PUSH,
      D3 SWAP,
      D3 LONG EXT,
      D2 PUSH,
        0 +XNORMBASE A6 I) D0 LONG MOVE,
      0 +YNORMBASE A6 I) D1 LONG MOVE,     \ save the regs
      D0 2 # LONG ASR,
      D1 2 # LONG ASR,
      D2 2 # LONG ASR,            \ scale for a write
      D3 2 # LONG ASR,
      SORT.MAP.ARRAY              \ write to the scan array
      D2 POP,
      D3 POP,
      D5 D3 LONG ADD,               \ increment x
      D6 D2 LONG ADD,             \ increment z

      0 +XNORMINC A6 I) D1 LONG MOVE,
      D1 0 +XNORMBASE A6 I) LONG ADD,
      0 +YNORMINC A6 I) D1 LONG MOVE,
      D1 0 +YNORMBASE A6 I) LONG ADD,

     D4 LOOP,                   \ repeat till done
    THEN,
  THEN,
R>, RTS, END-CODE

PROC.END


PROC.START

CODE (SCAN.MAP.EDGE.IN)
 >R,
   ' SET.MAP.DIFFS      4- BSR,
   ' SET.MAP.VARS       4- BSR,
   ' WRITE.MAP.EDGE     4- BSR,
 R>,
 RTS, END-CODE

PROC.END


PROC.START

CODE (SCAN.AMAP.EDGE.IN)
 >R,
   0 +PolyYMax A0 PBMove,
   A0 () D0 LONG MOVE,
   D0 2 # LONG ASL,
   D0 A0 () LONG MOVE,
   0 +PolyXMax A0 PBMove,
   A0 () D0 LONG MOVE,
   D0 2 # LONG ASL,
   D0 A0 () LONG MOVE,
   ' SET.MAP.DIFFS       4- BSR,
```

```
   ' SET.AMAP.VARS 4- BSR,
   ' WRITE.AMAP.EDGE     4- BSR,
   ' RESTORE.POLY.POINTS   4- BSR,
   0 +PolyYMax A0 PBMove,
   A0 () D0 LONG MOVE,
   D0 2 # LONG ASR,
   D0 A0 () LONG MOVE,
   0 +PolyXMax A0 PBMove,
   A0 () D0 LONG MOVE,
   D0 2 # LONG ASR,
   D0 A0 () LONG MOVE,
 R>,
 RTS, END-CODE

 PROC.END


 PROC.START


CODE (SCAN.ALL.MAP.EDGES)                 \ write scanarray for all lines
   >R,
   ' (CLEAR.LINE.SCAN) 4- BSR,           \ clear the line scan
   0 +POLYPOINTS# A0 PBMOVE,
   A0 () D1 LONG MOVE,
   D1 2 LONG SUBQ, PL IF,
     0 +POLYPOINTS A1 PBMove,
     BEGIN,
       D1 PUSH,                 \ save the loop
       A1 PUSH,                 \ save the pointer
       A1 PUSH,                 \ args for edge scan
       12 # A1 LONG ADDA,            \ polypointer, and - 12
       A1 PUSH,
       0 +Alias? A0 PBMove,
       A0 () LONG TST,
       EQ IF,
         ' (SCAN.MAP.EDGE.IN)  4- BSR,   \ do the scan
       ELSE,
         ' (SCAN.AMAP.EDGE.IN)   4- BSR,
       THEN,
       A1 POP,                  \ restore the pointer
       D1 POP,                  \ restore the loop
       12 # A1 LONG ADDA,            \ inc the pointer
     D1 LOOP,
     A1 PUSH,                   \ push current polypointer
     0 +POLYPOINTS A1 PBMove,
     A1 PUSH,                   \ push start point
     0 +Alias? A0 PBMove,
     A0 () LONG TST,
     EQ IF,
       ' (SCAN.MAP.EDGE.IN)    4- BSR,   \ do the scan
     ELSE,
       ' (SCAN.AMAP.EDGE.IN)   4- BSR,
     THEN,
   THEN,
   R>,
   RTS, END-CODE

  PROC.END


\ draws a scanline using normals and mapbuff
```

```
: 8MAP.LINE   ASSEMBLER
   D3 01 LONG SUBQ,
   PL IF,
    BEGIN,
    D4 SWAP,
    A1 () D4 Z.SIZE, CMP, LT IF,
      D4 A1 () Z.SIZE, MOVE,
      D1 Z.RECORD 2/  A1 I) Z.SIZE, MOVE,
      D2 SWAP,
      D6 D0 LONG MOVE,
      D0 SWAP,
      D2 D0 BYTE MOVE,
      D0 0 WORD A2 @I) A0 () BYTE MOVE,
      D2 SWAP,
    THEN,
    D4 SWAP,
    A1 Z.RECORD LONG ADDQ,
    A0 01 LONG ADDQ,
    D5 D4 LONG ADD,
    A4 D6 LONG ADD,
    D7 D2 LONG ADD,
   D3 WLOOP,
   THEN,  ;


\ a1 is zbuffer
\ a0 is display
\ d1 is objectid
\ d3 is xcount
\ d4 is zbase
\ d5 is zinc

\ a2 is mapbase
\ d6 is ymapbase
\ d2 is xmapbase
\ A4 is ymapinc
\ d7 is xmapinc


PROC.START

CODE (MaPOLYSCAN)   ( STARTY ENDY --)             \ draws a complex color scanline
  >R,
     2 SP@, D7 LONG MOVE,
  D7 01 LONG ADDQ,                     \ first line free for backscan
  BEGIN,
    BEGIN,
    0 +SCAN.ARRAY  a6 I) A2 LONG MOVE,           \ a2 is scan.array
    A2 A4 LONG MOVE,                   \ a4 is scan.array also
    0 +SCANINDEX A0 PBMOVE,                 \ a0 is scan.index
    D7 D6 LONG MOVE,                   \ d6 is y
    D6 SCAN.RECORD# 1- LONG ANDI,            \ low level bounds
    D6 2 # LONG ASL,                   \ d6 is y *2
    D6 0 WORD A0 @I) D5 LONG MOVE,           \ d5 is y index,
    D5 EDGE.COUNT LONG A2 @I) D0 LONG MOVE,       \ d0 is edge count
    D0 edge.record 2*  LONG SUBI, GE WHILE.L,      \ subtract two scans
      D0 D5 EDGE.COUNT LONG A2 @I) LONG MOVE,
      D0 A4 LONG ADDA,
      D5 X.START.SCAN LONG A4 @I) D1 LONG MOVE,     \ d1 is startx
      D5 Z.SCALE.BASE LONG A4 @I) D4 LONG MOVE,     \ d4 is zbase
      D5 X.END.SCAN   LONG A4 @I) D3 LONG MOVE,     \ d2 is endx
      D5 X.START.NORM LONG A4 @I) D2 LONG MOVE,     \ d2 is xmapbase
      D5 Y.START.NORM   LONG A4 @I) D6 LONG MOVE,   \ d6 is ymapbase
      D5 Y.ADDRESS LONG A2 @I) A0 LONG MOVE,       \
```

```
    D5 Z.ADDRESS LONG A2 @I) A1 LONG MOVE,        \ a1 is zbuffer for scanline
    D1 D3 LONG SUB,                 \ d3 is xdiff
    D1 A0 LONG ADDA,
    D1 Z.SHIFT # LONG ASL,               \ shift * z.record
    D1 A1 LONG ADDA,                \ a1 is zbuffer start

    0 +THEBUFFER A6 I) D0 LONG MOVE,         \ check for buffer use
    D0 Z.SHIFT LONG ANDI,
    D0 A1 LONG ADDA,                \ a1 is zbuffer
    D7 PUSH,                    \ save d7
    0 +ZXDIFF   A6 I) D5 LONG MOVE,        \ d5 is zxdiff
    0 +ymapdiff A6 I) A4 LONG MOVE,        \ d7 Is xmapinc
    0 +xmapdiff A6 I) D7 LONG MOVE,        \ d7 Is xmapinc
    0 +mapbuff  A6 I) A2 LONG MOVE,        \ A2 Is bitmap for map
    0 +OBJECTID A6 I) D1 LONG MOVE,        \ d1 is objectid
    8MAP.LINE
    D7 POP,                     \ restore d7
  REPEAT,
  D7 01 LONG ADDQ,                  \ increment scanline
  SP () D7 LONG CMP,
GT UNTIL, 2DROP,
R>, RTS,  END-CODE

PROC.END

0 +tempnormalpoints 0 +tempshade  - constant tempnorm

PROC.START

code NormDiff
  >R,

  3point.length +tempshade a0 pbmove,         \ a0 is 2nd point
  3point.length 2* +tempshade a1 pbmove,      \ a1 is 3rd point
  4 a0 i) d0 LONG MOVE,              \ d0 is 2nd y diff
  D0 ABS,
  4 a1 i) d1 LONG MOVE,
  D1 ABS,                     \ d1 is 3rd ydiff
  d0 d1 long cmp, pl if,
    a0 a1 exg,                  \ put biggest ydiff in a0
  then,

  \ now we make a new point and put it in the forth spot

  8 a0 I) d1 long move,
  4 a0 I) d2 long move,
  4 a1 I) d3 long move,
  d1 d3 d2 LONG.MUL.DIV,               \ d1 is new x
  d1 3point.length 3 * +tempshade 8 + a6 I) long move,    \ set forth point x

  a0 ()   d1 long move,
  4 a0 I) d2 long move,
  4 a1 I) d3 long move,
  d1 d3 d2 LONG.MUL.DIV,               \ d1 is new z
  d1 3point.length 3 * +tempshade  a6 I) long move,     \ set forth point z

  d2 3point.length 3 * +tempshade 4 +  a6 I) long move,   \ set forth point y

  tempnorm  a0 I)   d1 long move,
  4 a0 I) d2 long move,
  4 a1 I) d3 long move,
  d1 d3 d2 LONG.MUL.DIV,               \ d1 is new normal x
```

```
d1 3point.length 3 * +tempnormalpoints  a6 I) long move,  \ set forth normalpoint x

tempnorm 4 + a0 I)   d1 long move,
4 a0 I) d2 long move,
4 a1 I) d3 long move,
d1 d3 d2 LONG.MUL.DIV,              \ d1 is new normal y
d1 3point.length 3 * +tempnormalpoints  4 + a6 I) long move,  \ set forth normalpoint y


3point.length 3 * +tempshade a0 pbmove,           \ sort in x
8 a0 i) d0 long move,
8 a1 i) d0 long cmp, mi if,               \ a1 is small x
 a0 a1 exg,
then,

8 a0 i)  D2 long move,
a0 ()    d3 long move,

8 a1 I) d2  long sub,               \ d2 is x diff
a1 ()   d3  long sub,                \ set forth point z diff

d2 d3 FIX.DIV,                    \ d3 is new zxdiff
d3 0 +zxdiff a6 I) long move,

tempnorm  a0 I) d3 long move,
tempnorm  a1 I) d3 long sub,            \ set forth normalpoint x diff

d2 d3 FIX.DIV,                    \ d3 is new nxdiff
d3 0 +xmapdiff a6 I) long move,

tempnorm 4 + a0 I) d3 long move,
tempnorm 4 + a1 I)  d3 long sub,            \ set forth normalpoint y diff

d2 d3 FIX.DIV,                    \ d3 is new nxdiff
D3 8 # LONG ASL,
d3 0 +ymapdiff a6 I) long move,

0 #  0 +zydiff a6 I) long move,             \ zydiff is used only for lines
R>,
rts, end-code

PROC.END
```

```
\ Polygon Map Drawing

anew -polymap--

 PROC.START

 CODE   SET.MAP.DIFFS           \ ^3point ^3point -- writes scan.array
    >R,
    0 +TempPoint1  A0 PBMove,
    0 +TempPoint2  A1 PBMove,
    A2 POP,
      A2 ()    A0 () LONG MOVE,       \ move poly points to temp points
    4 A2 I) 4 A0 I) LONG MOVE,
    8 A2 I) 8 A0 I) LONG MOVE,

    0 +normalpoints 0 +polypoints -
      A2 I) 12 A0 I) LONG MOVE,
    4 +normalpoints 0 +polypoints -
      A2 I) 16 A0 I) LONG MOVE,

    A2 POP,
      A2 ()    A1 () LONG MOVE,
    4 A2 I) 4 A1 I) LONG MOVE,
    8 A2 I) 8 A1 I) LONG MOVE,

    0 +normalpoints 0 +polypoints -
      A2 I) 12 A1 I) LONG MOVE,
    4 +normalpoints 0 +polypoints -
      A2 I) 16 A1 I) LONG MOVE,

        4 A0 I) D0 LONG MOVE,
        4 A1 I) D0 LONG CMP,         \ compare y value of points
     MI IF,
        A1 A0 EXG,             \ exchange if a1 is greater
     THEN,
     A0 A4 LONG MOVE,
       4 A0 I) D4 LONG MOVE,
     4 A1 I) D4 LONG SUB,         \ d4 is ydiff
     8 A0 I) D3 LONG MOVE,
     8 A1 I) D3 LONG SUB,           \ d3 is xdiff

 \ CALC.X.SLOPE
     D3 D1 LONG MOVE,           \ d1 is xdiff
     D4 D1 FIX.DIV,             \ xdif / ydiff ,  d0 is scratch for fix div
       D1 D5 LONG MOVE,              \ d5 is xslope

 \ CALC.X.NORM
     12 A0 I) D3 LONG MOVE,
     12 A1 I) D3 LONG SUB,          \ d3 is diff
     D3 D1 LONG MOVE,           \ d4 is ydiff
     D4 D1 FIX.DIV,             \ dif / ydiff , d0 is scratch for fix.div
         D1 0 +xnorminc A6 I) LONG MOVE,    \ set +norminc
     12 A1 I) D2 LONG MOVE,         \
     D2 SWAP,              \ d2 = scaled zbase
     0 # D2 WORD MOVE,            \ clear low word
     d2 0 +xnormbase A6 I) LONG MOVE,    \ set  xnormbase

 \ CALC.Y.NORM
     16 A0 I) D3 LONG MOVE,
     16 A1 I) D3 LONG SUB,          \ d3 is diff
     D3 D1 LONG MOVE,           \ d4 is ydiff
     D4 D1 FIX.DIV,             \ dif / ydiff , d0 is scratch for fix.div
         D1 0 +ynorminc A6 I) LONG MOVE,    \ set ynorminc
     16 A1 I) D2 LONG MOVE,         \
```

```
    D2 SWAP,                \ d2 = scaled zbase
    0 # D2 WORD MOVE,            \ clear low word
    d2 0 -ynormbase A6 I) LONG MOVE,  \ set  ynormbase

\ CALC.Z.SLOPE
    A0 () D3 LONG MOVE,
    A1 () D3 LONG SUB,          \ d3 is zdiff
    D3 D1 LONG MOVE,          \ d4 is ydiff
    D4 D1 FIX.DIV,            \ zdif / ydiff , d0 is scratch for fix.div
        D1 D6 LONG MOVE,          \ d6 = zinc

    R>,
    RTS, END-CODE

  PROC.END

   decimal



\ NEW EDGE WRITING ROUTINE FOR COMPLEX POLYS


  hex

  PROC.START

 CODE SET.MAP.VARS
    >R,
    \ SET Y SCREEN ADDRESS
    4 A1 I) D7 LONG MOVE,           \ d7 = ymin
    4 A0 I) D4 LONG MOVE,           \ d4 - ymax
    D7 D4 LONG SUB,             \ d4 = ydiff
        D7 D0 LONG MOVE,            \ D0 - ymin
    0 +ScanIndex A2 PBMove,
    D0 SCAN.RECORD# 1- WORD ANDI,
        D0 2 # WORD ASL,
    D0 0 WORD A2 @I) D7 LONG MOVE,      \ d7 is offset to scan array
    0 +scan.array A6 I) A2 LONG MOVE,     \ a2 is scan array address
    D7 A2 LONG ADDA,             \ Now a2 is base of current record
    8 A1 I) D3 LONG MOVE,           \ d3 - xbase
    D3 SWAP,                \ d3 = scaled xbase
    0 # D3 WORD MOVE,             \ clear low word
    0 D7 MOVEQ,              \ d7 is index to current edge
    A1 () D2 LONG MOVE,           \ d2 - zbase
    D2 SWAP,                \ d2 - scaled zbase
    0 # D2 WORD MOVE,             \ clear low word
  R>, RTS, END-CODE

   PROC.END

 \ register variables for writing line to scan array

 \  d0 = temp
 \  d1 = free
 \  d2 = scaled zbase
 \  d3 = scaled xbase
 \  d4 = ydiff
 \  d5 = xslope
 \  d6 = zslope
 \  d7 = array y index
 \  a2 = array pointer
 \  a1 = free
 \  a0 = free
```

```
PROC.START

CODE SET.AMAP.VARS
   >R,
   4 A1 I) D7 LONG MOVE,           \ d7 = ymin
   4 A0 I) D4 LONG MOVE,           \ d4 = ymax
   A0 PUSH,
     D7 D0 LONG MOVE,
     D0 3 LONG ANDI,
     0 +AliasMask A0 PBMove,
     D0 4 A0 I) LONG MOVE,         \ set the alias mask
   A0 POP,
   D4 2 # LONG ASR,            \ scale down max y
   D7 2 # LONG ASR,            \ scale down min y
   D7 D4 LONG SUB,             \ d4 = ydiff
       D7 D0 LONG MOVE,            \ D0 = ymin
   0 +ScanIndex A2 PBMove,
   D0 SCAN.RECORD# 1- WORD ANDI,
       D0 2 # WORD ASL,
   D0 0 WORD A2 @I) D7 LONG MOVE,       \ d7 is offset to scan array
   0 +scan.array A0 PBMove,
   A0 () A2 LONG MOVE,           \ a2 is scan array address
   D7 A2 LONG ADDA,            \ Now a2 is base of current record
   0 D7 MOVEQ,               \ d7 is index to current edge
   8 A1 I) D3 LONG MOVE,           \ d3 = xbase
   D3 SWAP,                \ d3 = scaled xbase
   0 # D3 WORD MOVE,             \ clear low word
   A1 () D2 LONG MOVE,           \ d2 = zbase
   D2 SWAP,                \ d2 = scaled zbase
   0 # D2 WORD MOVE,             \ clear low word
  R>, RTS, END-CODE

  PROC.END

 decimal


DECIMAL


: SORT.MAP.ARRAY ASSEMBLER                    \ sorts new edge entry into edge table
  SCAN.RECORD.LENGTH # A2 LONG ADDA,              \ preincrement, scan starts at one
  EDGE.COUNT  A2 I) D7 LONG MOVE,               \ d7 is index into array of edges
  D7 MAX.EDGES EDGE.RECORD * EDGE.RECORD 1- -
  LONG CMPI, MI IF,                       \ tests the last acceptable count
    D1 8 # LONG ASL,
    D3  D7 X.START.SCAN WORD A2 @I) LONG MOVE,         \ move thisx to startx
        D2  D7 Z.SCALE.BASE WORD A2 @I) LONG MOVE,        \ move this z to startz
        D0  D7 X.START.NORM WORD A2 @I) LONG MOVE,        \ move this NORMX to start
        D1  D7 Y.START.NORM WORD A2 @I) LONG MOVE,        \ move this NORMY to start

    D7 EDGE.RECORD LONG SUBI,                  \ loop +EDGE.RECORD
    PL IF,
      BEGIN,                     \ start the loop
        D7 X.START.SCAN WORD A2 @I) D3 LONG CMP,     \ compare this x with last
        MI IF,                   \ if last > this then ....
            D7 X.START.SCAN WORD A2 @I)
            D7 X.END.SCAN   WORD A2 @I) LONG MOVE,     \ move startx to endx
          D7 Z.SCALE.BASE WORD A2 @I)
          D7 Z.END.BASE WORD A2 @I) LONG MOVE,     \ move startz to endz
```

```
        D7 X.START.NORM WORD A2 @I)
        D7 X.END.NORM WORD A2 @I) LONG MOVE,     \ move xnormstart to end
        D7 Y.START.NORM WORD A2 @I)
        D7 Y.END.NORM WORD A2 @I) LONG MOVE,     \ move ynormstart to end

        D3  D7 X.START.SCAN WORD A2 @I) LONG MOVE,  \ move thisx to startx
            D2  D7 Z.SCALE.BASE WORD A2 @I) LONG MOVE,  \ move this z to startz
            D0  D7 X.START.NORM WORD A2 @I) LONG MOVE,  \ move this NORMX to start
            D1  D7 Y.START.NORM WORD A2 @I) LONG MOVE,  \ move this NORMY to start

      ELSE,
        0 D7 MOVEQ,                  \ and stop
      THEN,
      D7 EDGE.RECORD LONG SUBI,              \ loop +EDGE.RECORD
    MI  UNTIL,
  THEN,
 EDGE.COUNT  A2 I) EDGE.RECORD  LONG ADDI,         \ increment edge count
 THEN,
 ;                              \ no line for phong


PROC.START

CODE WRITE.MAP.EDGE                      \ writes line to scan array
   >R,
   D4 1 LONG SUBQ,                 \ check loop for zero
   PL IF.L,
       D3 PUSH,
       D3 SWAP,
       D3 LONG EXT,
       0 +XNORMBASE A6 I) D0 LONG MOVE,
       0 +YNORMBASE A6 I) D1 LONG MOVE,       \ save the regs
       SORT.MAP.ARRAY                \ write to the scan array
       D3 POP,
       D5 D3 LONG ADD,               \ increment x
       D6 D2 LONG ADD,               \ increment z

       0 +XNORMINC A6 I) d1 LONG MOVE,
       d1 0 +XNORMBASE A6 I) LONG ADD,

       0 +YNORMINC A6 I) d1 LONG MOVE,
       d1 0 +YNORMBASE A6 I) LONG ADD,

      D4 1 LONG SUBQ,                  \ decrement loop, check for zero
        PL IF.L,
         BEGIN,
         D3 PUSH,
         D3 SWAP,
         D3 LONG EXT,
         0 +XNORMBASE A6 I) D0 LONG MOVE,
         0 +YNORMBASE A6 I) D1 LONG MOVE,       \ save the regs
         SORT.MAP.ARRAY                \ write to the scan array
         D3 POP,
         D5 D3 LONG ADD,               \ increment x
         D6 D2 LONG ADD,               \ increment z

         0 +XNORMINC A6 I) d1 LONG MOVE,
         d1 0 +XNORMBASE A6 I) LONG ADD,

         0 +YNORMINC A6 I) d1 LONG MOVE,
         d1 0 +YNORMBASE A6 I) LONG ADD,

       D4 LOOP,                    \ repeat till done
       THEN,
```

```
  THEN,
R>, RTS, END-CODE

PROC.END


PROC.START

CODE WRITE.AMAP.EDGE                    \ writes line to scan array
   >R,
   D4 1 LONG SUBQ,                      \ check loop for zero
   PL IF.L,

      D3 PUSH,
      D3 SWAP,
      D3 LONG EXT,
      D2 PUSH,
        0 +XNORMBASE A6 I) D0 LONG MOVE,
      0 +YNORMBASE A6 I) D1 LONG MOVE,       \ save the regs
      D0 2 # LONG ASR,
      D1 2 # LONG ASR,
      D2 2 # LONG ASR,                  \ scale for a write
      D3 2 # LONG ASR,
      SORT.MAP.ARRAY                    \ write to the scan array
      D2 POP,
      D3 POP,
      D5 D3 LONG ADD,                   \ increment x for roundoff
      D6 D2 LONG ADD,                   \ increment z for roundoff

      0 +XNORMINC A6 I) D1 LONG MOVE,
      D1 0 +XNORMBASE A6 I) LONG ADD,
      0 +YNORMINC A6 I) D1 LONG MOVE,
      D1 0 +YNORMBASE A6 I) LONG ADD,

      A0 PUSH,
      0 +AliasMask A0 PBMove,           \ fetch mask
      4 A0 I) D0 LONG MOVE,
      D0 1 LONG SUBQ,
      PL IF,
        BEGIN,
          D5 D3 LONG SUB,               \ increment x
          D6 D2 LONG SUB,               \ increment z
          0 +XNORMINC A6 I) D1 LONG MOVE,    \ increment normals
          D1 0 +XNORMBASE A6 I) LONG SUB,
          0 +YNORMINC A6 I) D1 LONG MOVE,
          D1 0 +YNORMBASE A6 I) LONG SUB,
        D0 LOOP,
      THEN,
      A0 POP,

      D5 2 # LONG ASL,                  \ scale up the increments
      D6 2 # LONG ASL,
      0 +XNORMINC A6 I) D0 LONG MOVE,
      D0 2 # LONG ASL,
      D0 0 +XNORMINC A6 I) LONG MOVE,        \ scale the normal increments
      0 +YNORMINC A6 I) D0 LONG MOVE,
      D0 2 # LONG ASL,
      D0 0 +YNORMINC A6 I) LONG MOVE,        \ scale the normal increments

      D5 D3 LONG ADD,                   \ increment x
      D6 D2 LONG ADD,                   \ increment z

      0 +XNORMINC A6 I) D1 LONG MOVE,
      D1 0 +XNORMBASE A6 I) LONG ADD,
```

```
      0 +YNORMINC A6 I) D1 LONG MOVE,
      D1 0 +YNORMBASE A6 I) LONG ADD,

     D4 1 LONG SUBQ,                  \ decrement loop, check for zero
       PL IF.L,
        BEGIN,
          D3 PUSH,
        D3 SWAP,
        D3 LONG EXT,
        D2 PUSH,
          0 +XNORMBASE A6 I) D0 LONG MOVE,
        0 +YNORMBASE A6 I) D1 LONG MOVE,     \ save the regs
        D0 2 # LONG ASR,
        D1 2 # LONG ASR,
        D2 2 # LONG ASR,             \ scale for a write
        D3 2 # LONG ASR,
        SORT.MAP.ARRAY               \ write to the scan array
        D2 POP,
        D3 POP,
        D5 D3 LONG ADD,                \ increment x
        D6 D2 LONG ADD,              \ increment z

        0 +XNORMINC A6 I) D1 LONG MOVE,
        D1 0 +XNORMBASE A6 I) LONG ADD,
        0 +YNORMINC A6 I) D1 LONG MOVE,
        D1 0 +YNORMBASE A6 I) LONG ADD,

      D4 LOOP,                    \ repeat till done
    THEN,
  THEN,
R>, RTS, END-CODE

PROC.END


PROC.START

CODE (SCAN.MAP.EDGE.IN)
 >R,
   ' SET.MAP.DIFFS      4- BSR,
   ' SET.MAP.VARS       4- BSR,
   ' WRITE.MAP.EDGE     4- BSR,
 R>,
 RTS, END-CODE

 PROC.END


PROC.START

CODE (SCAN.AMAP.EDGE.IN)
 >R,
   0 +PolyYMax A0 PBMove,
   A0 () D0 LONG MOVE,
   D0 2 # LONG ASL,
   D0 A0 () LONG MOVE,
   0 +PolyXMax A0 PBMove,
   A0 () D0 LONG MOVE,
   D0 2 # LONG ASL,
   D0 A0 () LONG MOVE,
   ' SET.MAP.DIFFS       4- BSR,
```

```
  ' SET.AMAP.VARS 4- BSR,
  ' WRITE.AMAP.EDGE     4- BSR,
  ' RESTORE.POLY.POINTS    4- BSR,
  0 +PolyYMax AO PBMove,
  AO () DO LONG MOVE,
  DO 2 # LONG ASR,
  DO AO () LONG MOVE,
  0 +PolyXMax AO PBMove,
  AO () DO LONG MOVE,
  DO 2 # LONG ASR,
  DO AO () LONG MOVE,
 R>,
 RTS, END-CODE

 PROC.END


 PROC.START


CODE (SCAN.ALL.MAP.EDGES)                    \ write scanarray for all lines
   >R,
   ' (CLEAR.LINE.SCAN) 4- BSR,           \ clear the line scan
   0 +POLYPOINTS# AO PBMOVE,
   AO () D1 LONG MOVE,
   D1 2 LONG SUBQ, PL IF,
     0 +POLYPOINTS A1 PBMove,
     BEGIN,
       D1 PUSH,                 \ save the loop
       A1 PUSH,                 \ save the pointer
       A1 PUSH,                 \ args for edge scan
       12 # A1 LONG ADDA,             \ polypointer, and + 12
       A1 PUSH,
       0 +Alias? AO PBMove,
       AO () LONG TST,
       EQ IF,
         ' (SCAN.MAP.EDGE.IN)  4- BSR,    \ do the scan
       ELSE,
         ' (SCAN.AMAP.EDGE.IN)   4- BSR,
       THEN,
       A1 POP,                  \ restore the pointer
       D1 POP,                  \ restore the loop
       12 # A1 LONG ADDA,             \ inc the pointer
     D1 LOOP,
     A1 PUSH,                   \ push current polypointer
     0 +POLYPOINTS A1 PBMove,
     A1 PUSH,                   \ push start point
     0 +Alias? AO PBMove,
     AO () LONG TST,
     EQ IF,
       ' (SCAN.MAP.EDGE.IN)     4- BSR,    \ do the scan
     ELSE,
       ' (SCAN.AMAP.EDGE.IN)    4- BSR,
     THEN,
   THEN,
   R>,
   RTS, END-CODE

  PROC.END


\ draws a scanline using normals and mapoff
```

```
: 8MAP.LINE   ASSEMBLER
   D3 01 LONG SUBQ,
   PL IF,
    BEGIN,
    D4 SWAP,
    A1 () D4 Z.SIZE, CMP, LT IF,
      D4 A1 () Z.SIZE, MOVE,
      D1 Z.RECORD 2/  A1 I) Z.SIZE, MOVE,
      D2 PUSH,
      SP ()  D2 BYTE MOVE,
      D2 0 WORD A2 @I) A0 () BYTE MOVE,
      D2 POP,
    THEN,
    D4 SWAP,
    A1 Z.RECORD LONG ADDQ,
    A0 01 LONG ADDQ,
    D5 D4 LONG ADD,
    D7 D2 LONG ADD,       \ D2 IS COMPLEX ZBASE
   D3 WLOOP,
   THEN,  ;


\ a1 is zbuffer
\ a0 is display
\ d1 is objectid
\ d3 is xcount
\ d4 is zbase
\ d5 is zinc

\ a2 is mapbase
\ d6 is ymapbase
\ d2 is xmapbase
\ A4 is ymapinc
\ d7 is xmapinc


PROC.START

CODE (MaPOLYSCAN)   ( STARTY ENDY -- )            \ draws a complex color scanline
  >R,
     2 SP@, D7 LONG MOVE,
  D7 01 LONG ADDQ,                     \ first line free for backscan
  BEGIN,
    BEGIN,
    0 -SCAN.ARRAY  a6 I) A2 LONG MOVE,           \ a2 is scan.array
    A2 A4 LONG MOVE,                   \ a4 is scan.array also
    0 +SCANINDEX A0 PBMOVE,                  \ a0 is scan.index
    D7 D6 LONG MOVE,                   \ d6 is y
    D6 SCAN.RECORD# 1- LONG ANDI,              \ low level bounds
    D6 2 # LONG ASL,                   \ d6 is y *2
    D6 0 WORD A0 @I) D5 LONG MOVE,             \ d5 is y index,
    D5 EDGE.COUNT LONG A2 @I) D0 LONG MOVE,        \ d0 is edge count
    D0 edge.record 2*  LONG SUBI, GE WHILE.L,        \ subtract two scans
      D0 D5 EDGE.COUNT LONG A2 @I) LONG MOVE,
      D0 A4 LONG ADDA,
      D5 X.START.SCAN LONG A4 @I) D1 LONG MOVE,      \ d1 is startx
      D5 Z.SCALE.BASE LONG A4 @I) D4 LONG MOVE,      \ d4 is zbase
      D5 X.END.SCAN   LONG A4 @I) D3 LONG MOVE,      \ d2 is endx
      D5 X.START.NORM LONG A4 @I) D2 LONG MOVE,      \ d2 is xmapbase
      D5 Y.START.NORM   LONG A4 @I) D6 LONG MOVE,    \ d6 is ymapbase
      D5 Y.ADDRESS LONG A2 @I) A0 LONG MOVE,       \
      D5 Z.ADDRESS LONG A2 @I) A1 LONG MOVE,       \ a1 is zbuffer for scanline
      D1 D3 LONG SUB,                  \ d3 is xdiff
      D1 A0 LONG ADDA,
```

```
    D1 Z.SHIFT # LONG ASL,               \ shift * z.record
    D1 A1 LONG ADDA,                \ a1 is zbuffer start

    0 +THEBUFFER A6 I) D0 LONG MOVE,        \ check for buffer use
    D0 Z.SHIFT LONG ANDI,
    D0 A1 LONG ADDA,                \ a1 is zbuffer
    D7 PUSH,                    \ save d7
    0 +ZXDIFF   A6 I) D5 LONG MOVE,         \ d5 is zxdiff
    0 +ymapdiff A6 I) A4 LONG MOVE,         \ d7 Is xmapinc
    0 +xmapdiff A6 I) D7 LONG MOVE,         \ d7 Is xmapinc
    0 +mapbuff  A6 I) A2 LONG MOVE,         \ A2 Is bitmap for map
    0 +OBJECTID A6 I) D1 LONG MOVE,         \ d1 is objectid
    8MAP.LINE
    D7 POP,                     \ restore d7
  REPEAT,
  D7 01 LONG ADDQ,                  \ increment scanline
  SP () D7 LONG CMP,
GT UNTIL, 2DROP,
R>, RTS,  END-CODE

PROC.END


0 +tempnormalpoints 0 +tempshade  - constant tempnorm


PROC.START

code NormDiff
  >R,

  3point.length +tempshade a0 pbmove,         \ a0 is 2nd point
  3point.length 2* +tempshade a1 pbmove,      \ a1 is 3rd point
  4 a0 i) d0 LONG MOVE,               \ d0 is 2nd y diff
  D0 ABS,
  4 a1 i) d1 LONG MOVE,
  D1 ABS,                     \ d1 is 3rd ydiff
  d0 d1 long cmp, pl if,
    a0 a1 exg,                    \ put biggest ydiff in a0
  then,

  \ now we make a new point and put it in the forth spot

  8 a0 I) d1 long move,
  4 a0 I) d2 long move,
  4 a1 I) d3 long move,
  d1 d3 d2 LONG.MUL.DIV,                \ d1 is new x
  d1 3point.length 3 * +tempshade 8 + a6 I) long move,    \ set forth point x

  a0 ()    d1 long move,
  4 a0 I) d2 long move,
  4 a1 I) d3 long move,
  d1 d3 d2 LONG.MUL.DIV,                \ d1 is new z
  d1 3point.length 3 * +tempshade  a6 I) long move,     \ set forth point z

  d2 3point.length 3 * +tempshade 4 -  a6 I) long move,    \ set forth point y

  tempnorm  a0 I)   d1 long move,
  4 a0 I) d2 long move,
  4 a1 I) d3 long move,
  d1 d3 d2 LONG.MUL.DIV,                \ d1 is new normal x
  d1 3point.length 3 * +tempnormalpoints  a6 I) long move,  \ set forth normal.point x

  tempnorm 4 + a0 I)   d1 long move,
```

```
4 a0 I) d2 long move,
4 a1 I) d3 long move,
d1 d3 d2 LONG.MUL.DIV,                \ d1 is new normal y
d1 3point.length 3 * +tempnormalpoints  4 + a6 I) long move,  \ set forth normalpoint y


3point.length 3 * +tempshade a0 pbmove,          \ sort in x
8 a0 i) d0 long move,
8 a1 i) d0 long cmp, mi if,             \ a1 is small x
  a0 a1 exg,
then,

8 a0 i)  D2 long move,
a0 ()    d3 long move,

8 a1 I) d2  long sub,                  \ d2 is x diff
a1 ()   d3  long sub,                   \ set forth point z diff

d2 d3 FIX.DIV,                    \ d3 is new zxdiff
d3 0 +zxdiff a6 I) long move,

tempnorm  a0 I) d3 long move,
tempnorm  a1 I) d3 long sub,            \ set forth normalpoint x diff

d2 d3 FIX.DIV,                    \ d3 is new nxdiff
d3 0 +xmapdiff a6 I) long move,

tempnorm 4 + a0 I) d3 long move,
tempnorm 4 + a1 I)  d3 long sub,          \ set forth normalpoint y diff

d2 d3 FIX.DIV,                    \ d3 is new nxdiff
d3 0 +ymapdiff a6 I) long move,

0 #  0 +zydiff a6 I) long move,           \ zydiff is used only for lines
R>,
rts, end-code

PROC.END
```

```
: WIPE.LINE   ASSEMBLER              \ fills scan segment
  D3 01 LONG SUBQ,                   \ d3 is length of run , subtract 1 for loop
  PL IF,
 0 D0 MOVEQ,                   \ run > 1
   BEGIN,                      \ begin loop
   D4 SWAP,                    \ hig word of z for test
   A1 () D4 Z.SIZE, CMP, LT IF,          \ compare this z with new
    D4   A1 () Z.SIZE, MOVE,         \ set the new z
    D1 Z.RECORD 2/ A1 I) Z.SIZE, MOVE,      \ set the new object i.d
    D0 D2 BSET,                \ set the mask bit
   THEN,
   D4 SWAP,
   D2 01 WORD SUBQ, MI IF,             \ d2 is byte count for bitmap
    D0 D2 BYTE MOVE,               \ d0 is mask for write
    D0 BYTE NOT,                 \ d0 is compliment to write mask
    A0 () D0 BYTE AND,             \ d0 is now active bits from screen
    D6 D2 BYTE AND,              \ d2 is now active new bits
    D2 D0 BYTE OR,               \ d0 is new screen byte
    D0 A0 )+ BYTE MOVE,            \ write the scrren byte
    7 D2 MOVEQ,                \ reset the bit count
    0 D0 MOVEQ, THEN,              \ reset the mask
   A1 Z.RECORD LONG ADDQ,             \ increment zbuffer address
   D5   D4 LONG ADD,              \ increment screen address
 D3 WLOOP,
    D0 D2 BYTE MOVE,               \ write out last byte
    D0 BYTE NOT,                 \ d0 is compliment to write mask
    A0 () D0 BYTE AND,             \ d0 is now active bits from screen
    D6 D2 BYTE AND,              \ d2 is now active new bits
    D2 D0 BYTE OR,               \ d0 is new screen byte
    D0 A0 () BYTE MOVE,            \ write the scrren byte
   THEN,  ;


: HWIPE.LINE   ASSEMBLER              \ writes zbuffer and object buffer
  D3 01 LONG SUBQ,                \ loop ends at -1
  PL IF,                     \ if not a zero loop
   BEGIN,                    \ start the write
   D4 SWAP,                  \ use low word of zbuffer
   A1 () D4 Z.SIZE, CMP, LT IF,          \ test the zbuffer value
       D4 A1 () Z.SIZE, MOVE,          \ set new z value
     D1 Z.RECORD 2/ A1 I) Z.SIZE, MOVE,     \ set new object id
   THEN,
   D4 SWAP,                  \ flip curent z back to fixed integer
   A1 Z.RECORD LONG ADDQ,            \ increment zbuffer address
   D5 D4 LONG ADD,               \ increment current z
  D3 LOOP,
  THEN, ;                    \ restore d7


: AWIPE.LINE   ASSEMBLER              \ writes zbuffer only, used for shadowing
  D3 01 LONG SUBQ,               \ set for loop ending at -1
  PL IF,                     \ if loop is non zero
   BEGIN,
   D4 SWAP,                   \ use high word for integer compares
   A1 () D4 Z.SIZE, CMP, LT IF,           \ test curent z value
     D4 A1 () Z.SIZE, MOVE,           \ set the zvalue in the zbuffer
   THEN,
   D4 SWAP,
```

```
 A1 Z.RECORD LONG ADDQ,
 D5 D4 LONG ADD,
 D3 LOOP,
THEN, ;


: WHITE.LINE   ASSEMBLER
 D3 01 LONG SUBQ,
 BEGIN,
  D4 SWAP,
  A1 () D4 Z.SIZE, CMP, LT IF,
    D4   A1 () Z.SIZE, MOVE,
    D1 Z.RECORD 2/  A1 I) Z.SIZE, MOVE,
    A0 () D2 BCLR,
  THEN,
  D4 SWAP,
  D2 WORD TST, EQ IF,
  A0 01 LONG ADDQ,
    8 D2 MOVEQ,  THEN,
  D2 01 WORD SUBQ,
  A1 Z.RECORD LONG ADDQ,
  D5 D4 LONG ADD,
 D3 LOOP,   ;


: 8WIPE.LINE  ASSEMBLER
  D3 01 LONG SUBQ,
  PL IF,
   BEGIN,
   D4 SWAP,
   A1 () D4 Z.SIZE, CMP, LT IF,
     D4 A1 () Z.SIZE, MOVE,
     D1 Z.RECORD 2/  A1 I) Z.SIZE, MOVE,
     D6 A0 () BYTE MOVE,
   THEN,
   D4 SWAP,
   A1 Z.RECORD LONG ADDQ,
   A0 01 LONG ADDQ,
   D5 D4 LONG ADD,
  D3 LOOP,
  THEN,  ;


: WHITE.8LINE   ASSEMBLER
  D3 01 LONG SUBQ,
  0 D6 MOVEQ,
  BEGIN,
   D4 SWAP,
   A1 () D4 Z.SIZE, CMP, LT IF,
     D4 A1 () Z.SIZE, MOVE,
     D1 Z.RECORD 2/  A1 I) Z.SIZE, MOVE,
     D6 A0 () BYTE MOVE,
   THEN,
   D4 SWAP,
   A1 Z.RECORD LONG ADDQ,
   A0 01 LONG ADDQ,
   D5 D4 LONG ADD,
  D3 LOOP,  ;


 : JUST.LINE  ASSEMBLER
    D3 01 LONG SUBQ,              \ loop ends at -1
```

```
                        \ we alway draw at least 1 line
 BEGIN,                          \ start the write
  D4 SWAP,                       \ use integer value of fixed integer
  A1 () D4 Z.SIZE, CMP, LE IF,            \ compare with current zbuffer
    D4 A1 () Z.SIZE, MOVE,            \ set new z value in zbuffer
    D1 Z.RECORD 2/ A1 I) Z.SIZE, MOVE,     \ set object id
    A0 () D2 BSET,                 \ write the line point
  THEN,
  D4 SWAP,                       \ z value is now fixed point
  D2 WORD TST, EQ IF,                 \ test bit counter, if zero
  A0 01 LONG ADDQ,                 \ increment screen
    8 D2 MOVEQ,  THEN,                \ reset bit counter
  D2 01 WORD SUBQ,                  \ decrement the bit count
  A1 Z.RECORD LONG ADDQ,              \ increment the zbuffer
  D5 D4 LONG ADD,                  \ increment the zcount
 D3 LOOP,  ;


: JUST8.LINE  ASSEMBLER
   D3 01 LONG SUBQ,
   BEGIN,
    D4 SWAP,
    A1 () D4 Z.SIZE, CMP, LT IF,
      D4 A1 () Z.SIZE, MOVE,
      D1 Z.RECORD 2/  A1 I) Z.SIZE, MOVE,
      D6 A0 () BYTE MOVE,
    THEN,
    D4 SWAP,
    A1 Z.RECORD LONG ADDQ,
    A0 01 LONG ADDQ,
    D5 D4 LONG ADD,
  D3 LOOP,  ;
```

```
ANEW --POLYCLIP--

." loading clipping "

   PROC.START

  CODE CLIP.PROJECT
  >R,
  0 +ORTHOGRAPHIC A0 PBMOVE,
  A0 () LONG TST, EQ IF,
    D4 RPUSH,
    D5 RPUSH,
    D0 D5 LONG MOVE,           \ save Z fixed point TO D5
    0 +CDISTANCE A1 PBMOVE,
    A1 () D4 LONG MOVE,
    D4 D3 LONG MOVE,
    D0 D4 LONG ADD,            \ add fixed viewing distance
    D4  40 10 SCALE LONG CMPI, MI IF,
        40 10 SCALE # D4 LONG MOVE,   \ clip z to near threshold
    THEN,
    D1 D3 D4 LONG.MUL.DIV,
    D2 D3 D4 LONG.MUL.DIV,
    D5 D3 D4 LONG.MUL.DIV,
    D5 D0 LONG MOVE,
   D5 RPOP,
   D4 RPOP,
   THEN,
  R>,
  RTS, END-CODE

  PROC.END


  FIX.SCALE 2- CONSTANT ALIAS.SCALE
  1  ALIAS.SCALE SCALE CONSTANT ALIAS.SCALE/2

  0 +tempnormalpoints 0 +TempShade - constant TempNormOff
  0 +normalpoints   0 +shadepoints - constant NormOff


  : FIX.AROUND,  ASSEMBLER
    REG1 2!
    REG1 2@ LONG TST, MI IF,
      REG1 2@ LONG NEG,
      REG1 2@ ALIAS.SCALE/2 LONG ADDI,
      REG1 2@ D3 LONG ASR,
      REG1 2@ WORD.RANGE LONG CMPI, PL IF,
        WORD.RANGE # REG1 2@ LONG MOVE,
      THEN,
      REG1 2@ LONG NEG,
    ELSE,
      REG1 2@ ALIAS.SCALE/2 LONG ADDI,
      REG1 2@ D3 LONG ASR,
      REG1 2@ WORD.RANGE LONG CMPI, PL IF,
        WORD.RANGE # REG1 2@ LONG MOVE,
      THEN,
    THEN, ;

  DECIMAL
```

```
: ALIAS.FIX>INTEGER, ASSEMBLER
 D3 RPUSH,
 ALIAS.SCALE D3 MOVEQ,
 D0  FIX.AROUND,
 D1  FIX.AROUND,
 D2  FIX.AROUND,
 D3 RPOP, ;


:   ADD.CLIP.POINT  ASSEMBLER
  locals| scale.point clip.offset first.point second.point |

  REGLIST D0-D7/A0-A2 RP -)  LONG MOVEM,     \ save regs
    D3 LONG TST, EQ IF,
      0 +POLYPOINTS# A0 PBMove,          \ set index to points
      A0 () D1 LONG MOVE,
      D1 1 LONG SUBQ,
      3POINT.LENGTH D2 MOVEQ,
      D1 D2 MULS,
      0  D3 MOVEQ,
    ELSE,
      3POINT.LENGTH -1 *  D2 MOVEQ,
      0 D3 MOVEQ,
    THEN,
    D2 SCALE.POINT LONG A1 @I) D0 LONG MOVE,
    D3 SCALE.POINT LONG A1 @I) D0 LONG CMP, MI IF,
      D2 D3 EXG,
    THEN,

    D2 SCALE.POINT LONG A1 @I) D7 LONG MOVE,
    D3 SCALE.POINT LONG A1 @I) D7 LONG SUB,   \ d7 is scaler

    clip.offset A0 PBMove,            \ d6 is scalee
    A0 () D6  LONG MOVE,
    clip.offset 0 +HITHERPLANE = IF
      D6 LONG NEG,
    THEN
    D3 SCALE.POINT LONG A1 @I) D1 LONG MOVE,
    D1 D6 LONG SUB,

    D2 FIRST.POINT LONG A1 @I) D5 LONG MOVE,
    D3 FIRST.POINT LONG A1 @I) D5 LONG SUB,   \ d6 is firstpoint diff
    D5 D6 D7 LONG.MUL.DIV,            \ convert to fix.scale
    D3 FIRST.POINT LONG A1 @I) D5 LONG ADD,
    D5 FIRST.POINT A2 I) LONG MOVE,        \ use clipped firstpoint

    D2 SECOND.POINT LONG A1 @I) D5 LONG MOVE,
    D3 SECOND.POINT LONG A1 @I) D5 LONG SUB,  \ d5 is secondpoint diff
    D5 D6 D7 LONG.MUL.DIV,             \ convert to fix.scale
    D3 SECOND.POINT LONG A1 @I) D5 LONG ADD,
    D5 SECOND.POINT A2 I) LONG MOVE,       \ use clipped secondpoint

    d2 normoff long addi,
    d3 normoff long addi,

    0 +POLYSELECT A6 I) D0 LONG MOVE,       \ test for phong rendering
    D0 PHONG 2 - 8 * LONG CMPI, EQ IF,
      D2  0 LONG A1 @I) D5 LONG MOVE,
      D3  0 LONG A1 @I) D5 LONG SUB,       \ d5 is normal x diff
      D5 D6 D7 LONG.MUL.DIV,
      D3  0 LONG A1 @I) D5 LONG ADD,
      D5 TEMPNORMOFF A2 I) LONG MOVE,      \ use clipped normal x

      D2  4  LONG A1 @I) D5 LONG MOVE,
```

```
    D3  4  LONG A1 @I) D5 LONG SUB,       \ d5 is normal y  diff
    D5 D6 D7 LONG.MUL.DIV,
    D3  4  LONG A1 @I) D5 LONG ADD,
    D5 TEMPNORMOFF 4 + A2 I) LONG MOVE,    \ use clipped normal y
  THEN,

  clip.offset a6 I) D0 LONG MOVE,        \ make hitherplane neg here
  clip.offset 0 +HITHERPLANE = IF
    D0 LONG NEG,
  THEN
  D0 SCALE.POINT A2 I) LONG MOVE,        \ move in clipping plane

 RP )+ REGLIST D0-D7/A0-A2  LONG MOVEM,       \ restore regs

 D7 MAX.TYPE.POINTS CMPI, MI IF,
   3POINT.LENGTH # A2 LONG ADDA,
   D7 1 LONG ADDQ,
 THEN,
;

: SET.POLY.POINTS,  ASSEMBLER
 0 +POLYPOINTS# A0 PBMove,
 0 +SHADEPOINTS A1 PBMove,
 0 +TEMPSHADE A2 PBMove,
 D7 A0 () LONG MOVE,                  \ set new #polypoints
 D7 1 LONG SUBQ, PL IF,
   BEGIN,
     TEMPNORMOFF A2 I) NORMOFF A1 I) LONG MOVE,
     A2 )+ A1 )+ LONG MOVE,            \ set new shade.points
     TEMPNORMOFF A2 I) NORMOFF A1 I) LONG MOVE,
     A2 )+ A1 )+ LONG MOVE,
     TEMPNORMOFF A2 I) NORMOFF A1 I) LONG MOVE,
     A2 )+ A1 )+ LONG MOVE,
   D7 LOOP,
 THEN, ;


PROC.START

CODE TEST.CUBE
>R,
  0 +CUBEBOUNDS A0 PBMove,       \ max x
  A0 () D2 LONG CMP, PL IF,
    D2 A0 () LONG MOVE,
  THEN,
  4 A0 I) D2 LONG CMP, MI IF,    \ min x
    D2 4 A0 I) LONG MOVE,
  THEN,

  8 A0 I) D1 LONG CMP, PL IF,    \ max y
    D1 8 A0 I) LONG MOVE,
  THEN,
  12 A0 I) D1 LONG CMP, MI IF,   \ min y
    D1 12 A0 I) LONG MOVE,
  THEN,

  16 A0 I) D0 LONG CMP, PL IF,   \ max z
    D0 16 A0 I) LONG MOVE,
  THEN,
  20 A0 I) D0 LONG CMP, MI IF,   \ min z
    D0 20 A0 I) LONG MOVE,
  THEN,
R>,
RTS,
```

```
END-CODE

PROC.END

PROC.START

CODE PROJECT.CLIP.POINTS
  0 +POLYPOINTS# A0 PBMove,
    A0 () D6 LONG MOVE,
    0 +SHADEPOINTS A2 PBMove,
    D6 1 LONG SUBQ,
    PL IF,
      BEGIN,                    \ project the point
        A2 () D0 LONG MOVE,
        4 A2 I) D1 LONG MOVE,
        8 A2 I) D2 LONG MOVE,
        ' CLIP.PROJECT 4- BSR,
        ' TEST.CUBE 4- BSR,
        D0 A2 () LONG MOVE,
        D1 4 A2 I) LONG MOVE,
        D2 8 A2 I) LONG MOVE,
        3POINT.LENGTH # A2 LONG ADDA,
      D6 LOOP,
    THEN,
RTS, END-CODE

PROC.END


\ d7 is #temp.points
\ a2 is temp.points
\ a1 is poly.points
\ d6 is in flag


: ADD.POINT, assembler
  A1 () A2 () LONG MOVE,
  4 A1 I) 4 A2 I) LONG MOVE,
  8 A1 I) 8 A2 I) LONG MOVE,

  NormOff   A1 I) TempNormOff    A2 I) LONG MOVE,    \ move normal points too
  NormOff 4 + A1 I) TempNormOff 4 + A2 I) LONG MOVE,
  NormOff 8 + A1 I) TempNormOff 8 - A2 I) LONG MOVE,

  D7 MAX.TYPE.POINTS CMPI, MI IF,
    3POINT.LENGTH # A2 LONG ADDA,
    D7 1 LONG ADDQ,
  THEN, ;



PROC.START

CODE ADD.HITHER.CLIP.POINT
  >R,
  8          \ x is second.point
  4          \ y is first.point
  0 +HITHERPLANE    \ hitherplane is clip.offset
    0          \ z is scale.point
  ADD.CLIP.POINT
  R>,
  RTS, END-CODE
```

```
PROC.END

PROC.START

CODE CLIP.HITHER.VERT
>R,
  SAVE.REGS
  0 d7 moveq,
  0 D3 MOVEQ,
  0 +SHADEPOINTS A1 PBMove,
  0 +TEMPSHADE A2 PBMove,
  0 +POLYPOINTS# A0 PBMove,
  A0 () D5 LONG MOVE,
  0 +HITHERPLANE A0 PBMove,
  A0 () D4 LONG MOVE,
  D4 LONG NEG,
  D5 1 LONG SUBQ, PL IF,                 \ if more then 1 point...
    3POINT.LENGTH D0 MOVEQ,
    D5 D0 MULS,
    D0 0 LONG A1 @I) D4 LONG CMP, PL IF,       \ test and set last point
      0 D6 MOVEQ,
    ELSE,
      -1 D6 MOVEQ,
    THEN,
    BEGIN,                          \ start loop to clip poly
      A1 () D4 LONG CMP, PL IF,
        D6 LONG TST, NE IF,
           ' ADD.HITHER.CLIP.POINT 4- BSR,  \ clip and add the point,
        THEN,
        D5 1 LONG SUBQ,
        0 D6 MOVEQ,                 \ set the in flag and increment count
        3POINT.LENGTH # A1 LONG ADDA,       \ increment the poly point
        -1 D3 MOVEQ,                \ set init flag
      ELSE,
        D6 LONG TST, EQ IF,            \ if in bounds and last was out
          ' ADD.HITHER.CLIP.POINT 4- BSR,   \ clip and add the point, no increment
        ELSE,
          ADD.POINT,                \ if in bounds and last was in, add point
          D5 1 LONG SUBQ,             \ increment the count
          3POINT.LENGTH # A1 LONG ADDA,     \ increment the poly point
          -1 D3 MOVEQ,              \ set init flag
        THEN,
        -1 D6 MOVEQ,                \ set the out flag
      THEN,
    D5 LONG TST, MI UNTIL,
  THEN,
  SET.POLY.POINTS,
  RESTORE.REGS
R>,
RTS, END-CODE

PROC.END


  PROC.START

CODE POLY.HITHER.CLIP
>R,
  SAVE.REGS
  0 +POLYPOINTS# A0 PBMove,
  A0 () D6 LONG MOVE,
  0 +SHADEPOINTS A1 PBMove,
```

```
-8000000 # D0 LONG MOVE,
D6 1 LONG SUBQ,
PL IF,
  BEGIN,
    A1 () D0 LONG CMP, MI IF,          \ find the largest
      A1 () D0 LONG MOVE,
    THEN,
    3POINT.LENGTH # A1 LONG ADDA,
  D6 LOOP,
  0 +HITHERPLANE A0 PBMove,            \ if larger z is smaller
  A0 () D1 LONG MOVE,
  D1 LONG NEG,
  D1 D0 LONG CMP, GT IF,               \ than hither plane then we must draw
    0 +POLYPOINTS# A0 PBMove,
    A0 () D6 LONG MOVE,
    0 +SHADEPOINTS A1 PBMove,
    8000000 # D0 LONG MOVE,
    D6 1 LONG SUBQ,
    BEGIN,
      A1 () D0 LONG CMP, PL IF,        \ find small z
        A1 () D0 LONG MOVE,
      THEN,
      3POINT.LENGTH # A1 LONG ADDA,
    D6 LOOP,
    0 +HITHERPLANE A0 PBMove,          \ if smaller z is larger
    A0 () D1 LONG MOVE,
    D1 LONG NEG,
    D1 D0 LONG CMP, LT IF,             \ than hither plane then we must CLIP
      ' CLIP.HITHER.VERT 4- BSR,
    THEN,
  ELSE,
    0 +POLYPOINTS# A0 PBMove,
    0 +SHADEPOINTS A1 PBMove,
    0 # A0 () LONG MOVE,
    0 # A1 () LONG MOVE,
    0 # 4 A1 I) LONG MOVE,
    0 # 8 A1 I) LONG MOVE,
  THEN,
 THEN,
RESTORE.REGS
R>,
RTS, END-CODE

PROC.END


PROC.START

CODE ADD.YON.CLIP.POINT
  >R,
  8            \ x is second.point
  4            \ y is first.point
  0 +YONPLANE     \ yon is clip.offset
    0          \ z is scale.point
  ADD.CLIP.POINT
  R>,
  RTS, END-CODE

PROC.END

PROC.START
```

```
CODE CLIP.YON.VERT
>R,
  SAVE.REGS
  0 d7 moveq,
  0 D3 MOVEQ,
  0 +SHADEPOINTS A1 PBMove,
  0 +TEMPSHADE A2 PBMove,
  0 +POLYPOINTS# A0 PBMove,
  A0 () D5 LONG MOVE,
  0 +YONPLANE A0 PBMove,
  A0 () D4 LONG MOVE,
  D5 1 LONG SUBQ, PL IF,              \ if more then 1 point...
    3POINT.LENGTH D0 MOVEQ,
    D5 D0 MULS,
    D0 0 LONG A1 @I) D4 LONG CMP, MI IF,     \ test and set last point
      0 D6 MOVEQ,
    ELSE,
      -1 D6 MOVEQ,
    THEN,
    BEGIN,                    \ start loop to clip poly
      A1 () D4 LONG CMP, MI IF,
        D6 LONG TST, NE IF,
          ' ADD.YON.CLIP.POINT 4- BSR, \ clip and add the point,
        THEN,
        D5 1 LONG SUBQ,
        0 D6 MOVEQ,              \ set the in flag and increment count
        3POINT.LENGTH # A1 LONG ADDA,      \ increment the poly point
        -1 D3 MOVEQ,            \ set init flag
      ELSE,
        D6 LONG TST, EQ IF,          \ if in bounds and last was out
          ' ADD.YON.CLIP.POINT 4- BSR,     \ clip and add the point, no increment
        ELSE,
          ADD.POINT,             \ if in bounds and last was in, add point
          D5 1 LONG SUBQ,          \ increment the count
          3POINT.LENGTH # A1 LONG ADDA,    \ increment the poly point
          -1 D3 MOVEQ,           \ set init flag
        THEN,
        -1 D6 MOVEQ,             \ set the out flag
      THEN,
    D5 LONG TST, MI UNTIL,
  THEN,
  SET.POLY.POINTS,
  RESTORE.REGS
R>,
RTS, END-CODE

PROC.END


  PROC.START

CODE POLY.YON.CLIP
>R,
  SAVE.REGS
  0 +POLYPOINTS# A0 PBMove,
  A0 () D6 LONG MOVE,
  0 +SHADEPOINTS A1 PBMove,
  -8000000 # D0 LONG MOVE,
  D6 1 LONG SUBQ,
  PL IF,
    BEGIN,
      A1 () D0 LONG CMP, PL IF,          \ find the smallest
        A1 () D0 LONG MOVE,
```

```
      THEN,
      3POINT.LENGTH # A1 LONG ADDA,
    D6 LOOP,
    0 +YONPLANE A0 PBMove,              \ if Smaller z is Larger
    A0 () D1 LONG MOVE,
    D1 D0 LONG CMP, LT IF,                \ than yon plane then we must draw
      0 +POLYPOINTS# A0 PBMove,
      A0 () D6 LONG MOVE,
      0 +SHADEPOINTS A1 PBMove,
      8000000 # D0 LONG MOVE,
      D6 1 LONG SUBQ,
      BEGIN,
        A1 () D0 LONG CMP, MI IF,       \ find large z
          A1 () D0 LONG MOVE,
        THEN,
        3POINT.LENGTH # A1 LONG ADDA,
      D6 LOOP,
      0 +YONPLANE A0 PBMove,            \ if large z is smaller
      A0 () D1 LONG MOVE,
      D1 D0 LONG CMP, GT IF,              \ than nither plane then we must CLIP
        ' CLIP.YON.VERT 4- BSR,
      THEN,
    ELSE,
      0 +POLYPOINTS# A0 PBMove,
      0 +SHADEPOINTS A1 PBMove,
      0 # A0 () LONG MOVE,
      0 # A1 () LONG MOVE,
      0 # 4 A1 I) LONG MOVE,
      0 # 8 A1 I) LONG MOVE,
    THEN,
  THEN,
RESTORE.REGS
R>,
RTS, END-CODE

PROC.END


PROC.START

CODE ADD.LEFT.CLIP.POINT
  >R,
  4            \ Y is second.point
  0            \ Z is first.point
  0 +LEFTPLANE     \ LEFTPLANE is clip.offset
    8            \ X is scale.point
  ADD.CLIP.POINT
  R>,
  RTS, END-CODE

PROC.END


  PROC.START

CODE CLIP.LEFT.VERT
>R,
  SAVE.REGS
  0 d7 moveq,
  0 D3 MOVEQ,
  0 +SHADEPOINTS A1 PBMove,
  0 +TEMPSHADE A2 PBMove,
  0 +POLYPOINTS# A0 PBMove,
```

```
  A0 () D5 LONG MOVE,
  0 +LEFTPLANE A0 PBMove,
  A0 () D4 LONG MOVE,
  D5 1 LONG SUBQ, PL IF,                    \ if more then 1 point...
    3POINT.LENGTH D0 MOVEQ,
    D5 D0 MULS,
    D0 8 LONG A1 @I) D4 LONG CMP, PL IF,       \ test and set last point
      0 D6 MOVEQ,
    ELSE,
      -1 D6 MOVEQ,
    THEN,
    BEGIN,                         \ start loop to clip poly
      8 A1 I) D4 LONG CMP, PL IF,
        D6 LONG TST, NE IF,
          ' ADD.LEFT.CLIP.POINT 4- BSR,     \ clip and add the point,
        THEN,
        D5 1 LONG SUBQ,
        0 D6 MOVEQ,                 \ set the in flag and increment count
        3POINT.LENGTH # A1 LONG ADDA,       \ increment the poly point
        -1 D3 MOVEQ,                \ set init flag
      ELSE,
        D6 LONG TST, EQ IF,             \ if in bounds and last was out
          ' ADD.LEFT.CLIP.POINT 4- BSR,    \ clip and add the point, no increment
        ELSE,
          ADD.POINT,                \ if in bounds and last was in, add point
          D5 1 LONG SUBQ,             \ increment the count
          3POINT.LENGTH # A1 LONG ADDA,      \ increment the poly point
          -1 D3 MOVEQ,              \ set init flag
        THEN,
        -1 D6 MOVEQ,                \ set the out flag
      THEN,
    D5 LONG TST, MI UNTIL,
  THEN,
  SET.POLY.POINTS,
  RESTORE.REGS
R>,
RTS, END-CODE

PROC.END


  PROC.START

CODE POLY.LEFT.CLIP
>R,
  SAVE.REGS
  0 +POLYPOINTS# A0 PBMove,
  A0 () D6 LONG MOVE,
  0 +SHADEPOINTS A1 PBMove,
  -8000000 # D0 LONG MOVE,
  D6 1 LONG SUBQ,
  PL IF,
    BEGIN,
      8 A1 I) D0 LONG CMP, MI IF,        \ find the largest x
        8 A1 I) D0 LONG MOVE,
      THEN,
      3POINT.LENGTH # A1 LONG ADDA,
    D6 LOOP,
    0 +LEFTPLANE A0 PBMove,            \ if larger x is larger than
    A0 () D1 LONG MOVE,
    D1 D0 LONG CMP, GT IF,               \ than left plane then we must draw
      0 +POLYPOINTS# A0 PBMove,
      A0 () D6 LONG MOVE,
```

```
      0 +SHADEPOINTS A1 PBMove,
      8000000 # D0 LONG MOVE,
      D6 1 LONG SUBQ,
      BEGIN,
        8 A1 I) D0 LONG CMP, PL IF,        \ find small x
          8 A1 I) D0 LONG MOVE,
        THEN,
        3POINT.LENGTH # A1 LONG ADDA,
      D6 LOOP,
      0 +LEFTPLANE A0 PBMove,             \ if smaller x is smaller
      A0 () D1 LONG MOVE,
      D1 D0 LONG CMP, LT IF,               \ than hither plane then we must CLIP
        ' CLIP.LEFT.VERT 4- BSR,
      THEN,
    ELSE,
      0 +POLYPOINTS# A0 PBMove,
      0 +SHADEPOINTS A1 PBMove,
      0 # A0 () LONG MOVE,
      0 # A1 () LONG MOVE,
      0 # 4 A1 I) LONG MOVE,
      0 # 8 A1 I) LONG MOVE,
    THEN,
  THEN,
RESTORE.REGS
R>,
RTS, END-CODE

PROC.END


PROC.START

CODE ADD.RIGHT.CLIP.POINT
  >R,
  4             \ Y is second.point
  0             \ Z is first.point
  0 +RIGHTPLANE      \ LEFTPLANE is clip.offset
    8            \ X is scale.point
  ADD.CLIP.POINT
  R>,
  RTS, END-CODE

PROC.END


PROC.START

CODE CLIP.RIGHT.VERT
>R,
  SAVE.REGS
  0 d7 moveq,
  0 D3 MOVEQ,
  0 +SHADEPOINTS A1 PBMove,
  0 +TEMPSHADE A2 PBMove,
  0 +POLYPOINTS# A0 PBMove,
  A0 () D5 LONG MOVE,
  0 +RIGHTPLANE A0 PBMove,
  A0 () D4 LONG MOVE,
  D5 1 LONG SUBQ, PL IF,                \ if more then 1 point...
    3POINT.LENGTH D0 MOVEQ,
    D5 D0 MULS,
    D0 8 LONG A1 @I) D4 LONG CMP, MI IF,      \ test and set last point
      0 D6 MOVEQ,
    ELSE,
```

```
    -1 D6 MOVEQ,
  THEN,
  BEGIN,                       \ start loop to clip poly
    8 A1 I) D4 LONG CMP, MI IF,
      D6 LONG TST, NE IF,
        ' ADD.RIGHT.CLIP.POINT 4- BSR,    \ clip and add the point,
      THEN,
      D5 1 LONG SUBQ,
      0 D6 MOVEQ,               \ set the in flag and increment count
      3POINT.LENGTH # A1 LONG ADDA,       \ increment the poly point
      -1 D3 MOVEQ,              \ set init flag
    ELSE,
      D6 LONG TST, EQ IF,           \ if in bounds and last was out
        ' ADD.RIGHT.CLIP.POINT 4- BSR,    \ clip and add the point, no increment
      ELSE,
        ADD.POINT,              \ if in bounds and last was in, add point
        D5 1 LONG SUBQ,           \ increment the count
        3POINT.LENGTH # A1 LONG ADDA,     \ increment the poly point
        -1 D3 MOVEQ,            \ set init flag
      THEN,
      -1 D6 MOVEQ,              \ set the out flag
    THEN,
  D5 LONG TST, MI UNTIL,
 THEN,
 SET.POLY.POINTS,
 RESTORE.REGS
R>,
RTS, END-CODE

PROC.END


 PROC.START

CODE POLY.RIGHT.CLIP
>R,
 SAVE.REGS
 0 +POLYPOINTS# A0 PBMove,
 A0 () D6 LONG MOVE,
 0 +SHADEPOINTS A1 PBMove,
 -8000000 # D0 LONG MOVE,
 D6 1 LONG SUBQ,
 PL IF,
   BEGIN,
     8 A1 I) D0 LONG CMP, PL IF,          \ find the smallest x
       8 A1 I) D0 LONG MOVE,
     THEN,
     3POINT.LENGTH # A1 LONG ADDA,
   D6 LOOP,
   0 +RIGHTPLANE A0 PBMove,           \ if small x is smaller than
   A0 () D1 LONG MOVE,
   D1 D0 LONG CMP, LT IF,             \ than right plane then we must draw
     0 +POLYPOINTS# A0 PBMove,
     A0 () D6 LONG MOVE,
     0 +SHADEPOINTS A1 PBMove,
     8000000 # D0 LONG MOVE,
     D6 1 LONG SUBQ,
     BEGIN,
       8 A1 I) D0 LONG CMP, MI IF,       \ find large x
         8 A1 I) D0 LONG MOVE,
       THEN,
       3POINT.LENGTH # A1 LONG ADDA,
     D6 LOOP,
```

```
      0 +RIGHTPLANE A0 PBMove,          \ if large x is larger
      A0 () D1 LONG MOVE,
      D1 D0 LONG CMP, GT IF,              \ than right plane then we must CLIP
        ' CLIP.RIGHT.VERT 4- BSR,
      THEN,
    ELSE,
      0 +POLYPOINTS# A0 PBMove,
      0 +SHADEPOINTS A1 PBMove,
      0 # A0 () LONG MOVE,
      0 # A1 () LONG MOVE,
      0 # 4 A1 I) LONG MOVE,
      0 # 8 A1 I) LONG MOVE,
    THEN,
  THEN,
RESTORE.REGS
R>,
RTS, END-CODE

PROC.END


PROC.START

CODE ADD.TOP.CLIP.POINT
  >R,
  8           \ X is second.point
  0           \ Z is first.point
  0 +TOPPLANE      \ LEFTPLANE is clip.offset
    4           \ Y is scale.point
  ADD.CLIP.POINT
  R>,
  RTS, END-CODE

PROC.END


  PROC.START

CODE CLIP.TOP.VERT
>R,
  SAVE.REGS
  0 d7 moveq,
  0 D3 MOVEQ,
  0 +SHADEPOINTS A1 PBMove,
  0 +TEMPSHADE A2 PBMove,
  0 +POLYPOINTS# A0 PBMove,
  A0 () D5 LONG MOVE,
  0 +TOPPLANE A0 PBMove,
  A0 () D4 LONG MOVE,
  D5 1 LONG SUBQ, PL IF,               \ if more then 1 point...
    3POINT.LENGTH D0 MOVEQ,
    D5 D0 MULS,
    D0 4 LONG A1 @I) D4 LONG CMP, PL IF,       \ test and set last point
      0 D6 MOVEQ,
    ELSE,
      -1 D6 MOVEQ,
    THEN,
    BEGIN,                         \ start loop to clip poly
      4 A1 I) D4 LONG CMP, PL IF,
        D6 LONG TST, NE IF,
          ' ADD.TOP.CLIP.POINT 4- BSR,    \ clip and add the point,
        THEN,
        D5 1 LONG SUBQ,
```

```
      0 D6 MOVEQ,               \ set the in flag and increment count
      3POINT.LENGTH # A1 LONG ADDA,       \ increment the poly point
      -1 D3 MOVEQ,              \ set init flag
    ELSE,
      D6 LONG TST, EQ IF,           \ if in bounds and last was out
        ' ADD.TOP.CLIP.POINT 4- BSR,    \ clip and add the point, no increment
      ELSE,
        ADD.POINT,              \ if in bounds and last was in, add point
        D5 1 LONG SUBQ,           \ increment the count
        3POINT.LENGTH # A1 LONG ADDA,     \ increment the poly point
        -1 D3 MOVEQ,            \ set init flag
      THEN,
      -1 D6 MOVEQ,              \ set the out flag
    THEN,
  D5 LONG TST, MI UNTIL,
 THEN,
 SET.POLY.POINTS,
 RESTORE.REGS
R>,
RTS, END-CODE

PROC.END


 PROC.START

CODE POLY.TOP.CLIP
>R,
 SAVE.REGS
 0 +POLYPOINTS# A0 PBMove,
 A0 () D6 LONG MOVE,
 0 +SHADEPOINTS A1 PBMove,
 -8000000 # D0 LONG MOVE,
 D6 1 LONG SUBQ,
 PL IF,
   BEGIN,
     4 A1 I) D0 LONG CMP, MI IF,          \ find the largest y
       4 A1 I) D0 LONG MOVE,
     THEN,
     3POINT.LENGTH # A1 LONG ADDA,
   D6 LOOP,
   0 +TOPPLANE A0 PBMove,             \ if larger x is larger than
   A0 () D1 LONG MOVE,
   D1 D0 LONG CMP, GT IF,              \ than left plane then we must draw
     0 +POLYPOINTS# A0 PBMove,
     A0 () D6 LONG MOVE,
     0 +SHADEPOINTS A1 PBMove,
     8000000 # D0 LONG MOVE,
     D6 1 LONG SUBQ,
     BEGIN,
       4 A1 I) D0 LONG CMP, PL IF,        \ find small y
         4 A1 I) D0 LONG MOVE,
       THEN,
       3POINT.LENGTH # A1 LONG ADDA,
     D6 LOOP,
     0 +TOPPLANE A0 PBMove,            \ if smaller x is smaller
     A0 () D1 LONG MOVE,
     D1 D0 LONG CMP, LT IF,             \ than hither plane then we must CLIP
       ' CLIP.TOP.VERT 4- BSR,
     THEN,
   ELSE,
     0 +POLYPOINTS# A0 PBMove,
     0 +SHADEPOINTS A1 PBMove,
```

```
      0 # A0 () LONG MOVE,
      0 # A1 () LONG MOVE,
      0 # 4 A1 I) LONG MOVE,
      0 # 8 A1 I) LONG MOVE,
    THEN,
  THEN,
RESTORE.REGS
R>,
RTS, END-CODE

PROC.END


PROC.START

  CODE ADD.BOTTOM.CLIP.POINT
    >R,
    8           \ X is second.point
    0           \ Z is first.point
    0 +BOTTOMPLANE    \ LEFTPLANE is clip.offset
      4           \ Y is scale.point
    ADD.CLIP.POINT
    R>,
    RTS, END-CODE

  PROC.END


    PROC.START

  CODE CLIP.BOTTOM.VERT
  >R,
    SAVE.REGS
    0 d7 moveq,
    0 D3 MOVEQ,
    0 +SHADEPOINTS A1 PBMove,
    0 +TEMPSHADE A2 PBMove,
    0 +POLYPOINTS# A0 PBMove,
    A0 () D5 LONG MOVE,
    0 +BOTTOMPLANE A0 PBMove,
    A0 () D4 LONG MOVE,
    D5 1 LONG SUBQ, PL IF,                \ if more then 1 point...
      3POINT.LENGTH D0 MOVEQ,
      D5 D0 MULS,
      D0 4 LONG A1 @I) D4 LONG CMP, MI IF,      \ test and set last point
        0 D6 MOVEQ,
      ELSE,
        -1 D6 MOVEQ,
      THEN,
      BEGIN,                        \ start loop to clip poly
        4 A1 I) D4 LONG CMP, MI IF,
          D6 LONG TST, NE IF,
            ' ADD.BOTTOM.CLIP.POINT 4- BSR,   \ clip and add the point,
          THEN,
          D5 1 LONG SUBQ,
          0 D6 MOVEQ,               \ set the in flag and increment count
          3POINT.LENGTH # A1 LONG ADDA,       \ increment the poly point
          -1 D3 MOVEQ,              \ set init flag
        ELSE,
          D6 LONG TST, EQ IF,           \ if in bounds and last was out
            ' ADD.BOTTOM.CLIP.POINT 4- BSR,   \ clip and add the point, no increment
          ELSE,
            ADD.POINT,              \ if in bounds and last was in, add point
            D5 1 LONG SUBQ,           \ increment the count
```

```
        3POINT.LENGTH # A1 LONG ADDA,      \ increment the poly point
        -1 D3 MOVEQ,                \ set init flag
      THEN,
      -1 D6 MOVEQ,                  \ set the out flag
    THEN,
  D5 LONG TST, MI UNTIL,
 THEN,
 SET.POLY.POINTS,
 RESTORE.REGS
R>,
RTS, END-CODE

PROC.END


 PROC.START

CODE POLY.BOTTOM.CLIP
>R,
 SAVE.REGS
 0 +POLYPOINTS# A0 PBMove,
 A0 () D6 LONG MOVE,
 0 +SHADEPOINTS A1 PBMove,
 -8000000 # D0 LONG MOVE,
 D6 1 LONG SUBQ,
 PL IF,
   BEGIN,
     4 A1 I) D0 LONG CMP, PL IF,            \ find the smallest Y
       4 A1 I) D0 LONG MOVE,
     THEN,
     3POINT.LENGTH # A1 LONG ADDA,
   D6 LOOP,
   0 +BOTTOMPLANE A0 PBMove,              \ if small Y is smaller than
   A0 () D1 LONG MOVE,
   D1 D0 LONG CMP, LT IF,                 \ than bottom plane then we must draw
     0 +POLYPOINTS# A0 PBMove,
     A0 () D6 LONG MOVE,
     0 +SHADEPOINTS A1 PBMove,
     8000000 # D0 LONG MOVE,
     D6 1 LONG SUBQ,
     BEGIN,
       4 A1 I) D0 LONG CMP, MI IF,        \ find large y
         4 A1 I) D0 LONG MOVE,
       THEN,
       3POINT.LENGTH # A1 LONG ADDA,
     D6 LOOP,
     0 +BOTTOMPLANE A0 PBMove,            \ if large y is larger
     A0 () D1 LONG MOVE,
     D1 D0 LONG CMP, GT IF,               \ than bottom plane then we must CLIP
       ' CLIP.BOTTOM.VERT 4- BSR,
     THEN,
   ELSE,
     0 +POLYPOINTS# A0 PBMove,
     0 +SHADEPOINTS A1 PBMove,
     0 # A0 () LONG MOVE,
     0 # A1 () LONG MOVE,
     0 # 4 A1 I) LONG MOVE,
     0 # 8 A1 I) LONG MOVE,
   THEN,
 THEN,
RESTORE.REGS
R>,
RTS, END-CODE
```

```
PROC.END

PROC.START

CODE (TRANS.POINT)                          \ shunts poly.points
 >R,
  0 +POLYCLIP? A6 I) D0 LONG MOVE,
NE IF,
    D0 HITHERCLIP YONCLIP OR LONG ANDI, NE IF,
      0 +POLYCLIP? A6 I) D0 LONG MOVE,
      D0 HITHERCLIP LONG ANDI, NE IF,
        ' POLY.HITHER.CLIP 4- BSR,
    THEN,
      0 +POLYCLIP? A6 I) D0 LONG MOVE,
      D0 yonclip LONG ANDI, NE IF,
        ' POLY.YON.CLIP 4- BSR,
    THEN,
    ' PROJECT.CLIP.POINTS 4- BSR,
  THEN,
  ' POLY.RIGHT.CLIP   4- BSR,
  ' POLY.LEFT.CLIP  4- BSR,
  ' POLY.TOP.CLIP   4- BSR,
  ' POLY.BOTTOM.CLIP  4- BSR,
 THEN,
 0 +ALIAS? A0 PBMove,
 A0 () LONG TST,
 EQ IF.L,
   0 +POLYPOINTS# A0 PBMove,
     A0 () D3 LONG MOVE,
      D3 1 LONG SUBQ,
     PL IF.L,
     0 +POLYPOINTS A2 PBMove,
   0 +SHADEPOINTS A0 PBMove,
   0 +ZBUFFSCALE A1 PBMove,
   A1 () D6 LONG MOVE,
     BEGIN,
     9 D1 MOVEQ,
     NORMOFF A0 I) D0 LONG MOVE,        \ scale the normal.points
       D0 D1 LONG ASR,
       D0 LONG NEG,
     D0 NORMOFF A0 I) LONG MOVE,
     NORMOFF 4+ A0 I) D0 LONG MOVE,
       D0 D1 LONG ASR,
       D0 LONG NEG,
     D0 NORMOFF 4+ A0 I) LONG MOVE,
     NORMOFF 8 + A0 I) D0 LONG MOVE,
       D0 D1 LONG ASR,
     D0 NORMOFF 8 + A0 I) LONG MOVE,
     A0 () D0 LONG MOVE,
     4 A0 I) D1 LONG MOVE,
     8 A0 I) D2 LONG MOVE,
     D6 LONG TST, PL IF,
         D0 D6 LONG ASR,
      ELSE,
      D6 D4 LONG MOVE,
      D4 LONG NEG,
      D0 D4 LONG ASL,
      THEN,
      0 +YALIASOFFSET A1 PBMove,
      A1 () D1 LONG ADD,
      0 +XALIASOFFSET A1 PBMove,
      A1 () D2 LONG ADD,
```

```
      FIX>INTEGER,
    0 +YOFFSET A1 PBMove,
    A1 () D1 LONG ADD,
    0 +XOFFSET A1 PBMove,
    A1 () D2 LONG ADD,
    D0 A2 () LONG MOVE,
    D1 4 A2 I) LONG MOVE,
    D2 8 A2 I) LONG MOVE,
    12 # A2 LONG ADDA,
    12 # A0 LONG ADDA,
    D3 LOOP,
    THEN,
ELSE.L,
  0 +POLYPOINTS# A0 PBMove,
    A0 () D3 LONG MOVE,
     D3 1 LONG SUBQ,
    PL IF.L,
    0 +POLYPOINTS A2 PBMove,
  0 +SHADEPOINTS A0 PBMove,
  0 +ZBUFFSCALE A1 PBMove,
  A1 () D6 LONG MOVE,
    BEGIN,
    7 D1 MOVEQ,               \ scale the normal points
    NORMOFF A0 I) D0 LONG MOVE,
      D0 D1 LONG ASR,
      D0 LONG NEG,
    D0 NORMOFF A0 I) LONG MOVE,
    NORMOFF 4+ A0 I) D0 LONG MOVE,
      D0 D1 LONG ASR,
      D0 LONG NEG,
    D0 NORMOFF 4+ A0 I) LONG MOVE,
    NORMOFF 8 + A0 I) D0 LONG MOVE,
      D0 D1 LONG ASR,
    D0 NORMOFF 8 + A0 I) LONG MOVE,
      A0 () D0 LONG MOVE,
    4 A0 I) D1 LONG MOVE,
    8 A0 I) D2 LONG MOVE,
    D6 LONG TST, PL IF,
        D0 D6 LONG ASR,
      ELSE,
      D6 D4 LONG MOVE,
      D4 LONG NEG,
      D0 D4 LONG ASL,
    THEN,
    0 +YALIASOFFSET A1 PBMove,
    A1 () D1 LONG ADD,
    0 +XALIASOFFSET A1 PBMove,
    A1 () D2 LONG ADD,
      ALIAS.FIX>INTEGER,
    0 +YOFFSET A1 PBMove,
    A1 () D4 LONG MOVE,
    D4 2 # LONG ASL,
    D4 D1 LONG ADD,
    0 +XOFFSET A1 PBMove,
    A1 () D4 LONG MOVE,
    D4 2 # LONG ASL,
    D4 D2 LONG ADD,
    D0 A2 () LONG MOVE,
    D1 4 A2 I) LONG MOVE,
    D2 8 A2 I) LONG MOVE,
    12 # A2 LONG ADDA,
    12 # A0 LONG ADDA,
    D3 LOOP,
    THEN,
```

```
ANEW --POLYCLIP--

." loading clipping "

   PROC.START

  CODE CLIP.PROJECT
  >R,
  0 +ORTHOGRAPHIC A0 PBMOVE,
  A0 () LONG TST, EQ IF,
    D4 RPUSH,
    D5 RPUSH,
    D0 D5 LONG MOVE,           \ save 2 fixed point TO D5
    0 +CDISTANCE A1 PBMOVE,
    A1 () D4 LONG MOVE,
    D4 D3 LONG MOVE,
    D0 D4 LONG ADD,            \ add fixed viewing distance
    D4  40 10 SCALE LONG CMPI, MI IF,
        40 10 SCALE # D4 LONG MOVE,    \ clip z to near threshold
    THEN,
    D1 D3 D4 LONG.MUL.DIV,
    D2 D3 D4 LONG.MUL.DIV,
    D5 D3 D4 LONG.MUL.DIV,
    D5 D0 LONG MOVE,
   D5 RPOP,
   D4 RPOP,
   THEN,
  R>,
  RTS, END-CODE

  PROC.END


  FIX.SCALE 2- CONSTANT ALIAS.SCALE
  1  ALIAS.SCALE SCALE CONSTANT ALIAS.SCALE/2

  0 +tempnormalpoints 0 +TempShade - constant TempNormOff
  0 +normalpoints   0 +shadepoints - constant NormOff


  : FIX.AROUND,  ASSEMBLER
    REG1 2!
    REG1 2@ LONG TST, MI IF,
      REG1 2@ LONG NEG,
      REG1 2@ ALIAS.SCALE/2 LONG ADDI,
      REG1 2@ D3 LONG ASR,
      REG1 2@ WORD.RANGE LONG CMPI, PL IF,
        WORD.RANGE # REG1 2@ LONG MOVE,
      THEN,
      REG1 2@ LONG NEG,
    ELSE,
      REG1 2@ ALIAS.SCALE/2 LONG ADDI,
      REG1 2@ D3 LONG ASR,
      REG1 2@ WORD.RANGE LONG CMPI, PL IF,
        WORD.RANGE # REG1 2@ LONG MOVE,
      THEN,
    THEN, ;

DECIMAL
```

```
: ALIAS.FIX>INTEGER, ASSEMBLER
 D3 RPUSH,
 ALIAS.SCALE D3 MOVEQ,
 D0  FIX.AROUND,
 D1  FIX.AROUND,
 D2  FIX.AROUND,
 D3 RPOP, ;


:   ADD.CLIP.POINT  ASSEMBLER
 locals: scale.point clip.offset first.point second.point

 REGLIST D0-D7/A0-A2 RP -) LONG MOVEM,     \ save regs
   D3 LONG TST, EQ IF,
     0 +POLYPOINTS# A0 PBMove,          \ set index to points
     A0 () D1 LONG MOVE,
     D1 1 LONG SUBQ,
     3POINT.LENGTH D2 MOVEQ,
     D1 D2 MULS,
     0  D3 MOVEQ,
   ELSE,
     3POINT.LENGTH -1 *  D2 MOVEQ,
     0 D3 MOVEQ,
   THEN,
   D2 SCALE.POINT LONG A1 @I) D0 LONG MOVE,
   D3 SCALE.POINT LONG A1 @I) D0 LONG CMP, MI IF,
     D2 D3 EXG,
   THEN,

   D2 SCALE.POINT LONG A1 @I) D7 LONG MOVE,
   D3 SCALE.POINT LONG A1 @I) D7 LONG SUB,    \ d7 is scaler

   clip.offset A0 PBMove,             \ d6 is scalee
   A0 () D6  LONG MOVE,
   clip.offset 0 +HITHERPLANE = IF
     D6 LONG NEG,
   THEN
   D3 SCALE.POINT LONG A1 @I) D1 LONG MOVE,
   D1 D6 LONG SUB,

   D2 FIRST.POINT LONG A1 @I) D5 LONG MOVE,
   D3 FIRST.POINT LONG A1 @I) D5 LONG SUB,   \ d6 is firstpoint diff
   D5 D6 D7 LONG.MUL.DIV,            \ convert to fix.scale
   D3 FIRST.POINT LONG A1 @I) D5 LONG ADD,
   D5 FIRST.POINT A2 I) LONG MOVE,        \ use clipped firstpoint

   D2 SECOND.POINT LONG A1 @I) D5 LONG MOVE,
   D3 SECOND.POINT LONG A1 @I) D5 LONG SUB,  \ d5 is secondpoint diff
   D5 D6 D7 LONG.MUL.DIV,            \ convert to fix.scale
   D3 SECOND.POINT LONG A1 @I) D5 LONG ADD,
   D5 SECOND.POINT A2 I) LONG MOVE,       \ use clipped secondpoint

   d2 normoff long addi,
   d3 normoff long addi,

   0 +POLYSELECT A6 I) D0 LONG MOVE,       \ test for phong rendering
   D0 PHONG 2 - 8 * LONG CMPI, EQ IF,
     D2  0 LONG A1 @I) D5 LONG MOVE,
     D3  0 LONG A1 @I) D5 LONG SUB,       \ d5 is normal x diff
     D5 D6 D7 LONG.MUL.DIV,
     D3  0 LONG A1 @I) D5 LONG ADD,
     D5 TEMPNORMOFF A2 I) LONG MOVE,      \ use clipped normal x

     D2  4  LONG A1 @I) D5 LONG MOVE,
```

```
    D3  4  LONG A1 @I) D5 LONG SUB,      \ db is normal y diff
    D5 D6 D7 LONG.MUL.DIV,
    D3  4  LONG A1 @I) D5 LONG ADD,
    D5 TEMPNORMOFF 4 + A2 I) LONG MOVE,   \ use clipped normal y
   THEN,

   clip.offset a6 I) D0 LONG MOVE,       \ make hitherplane neg here
   clip.offset 0 +HITHERPLANE = IF
    D0 LONG NEG,
   THEN
   D0 SCALE.POINT A2 I) LONG MOVE,       \ move in clipping plane

 RP )+ REGLIST D0-D7/A0-A2  LONG MOVEM,        \ restore regs

 D7 MAX.TYPE.POINTS CMPI, MI IF,
   3POINT.LENGTH # A2 LONG ADDA,
   D7 1 LONG ADDQ,
 THEN,
 ;

: SET.POLY.POINTS,  ASSEMBLER
  0 +POLYPOINTS# A0 PBMove,
  0 +SHADEPOINTS A1 PBMove,
  0 +TEMPSHADE A2 PBMove,
  D7 A0 () LONG MOVE,                  \ set new #polypoints
  D7 1 LONG SUBQ, PL IF,
    BEGIN,
      TEMPNORMOFF A2 I) NORMOFF A1 I) LONG MOVE,
      A2 )+ A1 )+ LONG MOVE,           \ set new shade.points
      TEMPNORMOFF A2 I) NORMOFF A1 I) LONG MOVE,
      A2 )+ A1 )+ LONG MOVE,
      TEMPNORMOFF A2 I) NORMOFF A1 I) LONG MOVE,
      A2 )+ A1 )+ LONG MOVE,
    D7 LOOP,
  THEN, ;


PROC.START

CODE TEST.CUBE
>R,
  0 +CUBEBOUNDS A0 PBMove,      \ max x
  A0 () D2 LONG CMP, PL IF,
    D2 A0 () LONG MOVE,
  THEN,
  4 A0 I) D2 LONG CMP, MI IF,    \ min x
    D2 4 A0 I) LONG MOVE,
  THEN,

  8 A0 I) D1 LONG CMP, PL IF,    \ max y
    D1 8 A0 I) LONG MOVE,
  THEN,
  12 A0 I) D1 LONG CMP, MI IF,   \ min y
    D1 12 A0 I) LONG MOVE,
  THEN,

  16 A0 I) D0 LONG CMP, PL IF,   \ max z
    D0 16 A0 I) LONG MOVE,
  THEN,
  20 A0 I) D0 LONG CMP, MI IF,   \ min z
    D0 20 A0 I) LONG MOVE,
  THEN,
 R>,
 RTS,
```

```
END-CODE

PROC.END

PROC.START

CODE PROJECT.CLIP.POINTS
  0 -POLYPOINTS# A0 PBMove,
    A0 () D6 LONG MOVE,
    0 +SHADEPOINTS A2 PBMove,
    D6 1 LONG SUBQ,
    PL IF,
      BEGIN,                  \ project the point
        A2 () D0 LONG MOVE,
        4 A2 I) D1 LONG MOVE,
        8 A2 I) D2 LONG MOVE,
        ' CLIP.PROJECT 4- BSR,
        ' TEST.CUBE 4- BSR,
        D0 A2 () LONG MOVE,
        D1 4 A2 I) LONG MOVE,
        D2 8 A2 I) LONG MOVE,
        3POINT.LENGTH # A2 LONG ADDA,
      D6 LOOP,
    THEN,
RTS, END-CODE

PROC.END


\ d7 is #temp.points
\ a2 is temp.points
\ a1 is poly.points
\ d6 is in flag


: ADD.POINT, assembler
  A1 () A2 () LONG MOVE,
  4 A1 I) 4 A2 I) LONG MOVE,
  8 A1 I) 8 A2 I) LONG MOVE,

  NormOff   A1 I) TempNormOff    A2 I) LONG MOVE,   \ move normal points too
  NormOff 4 + A1 I) TempNormOff 4 + A2 I) LONG MOVE,
  NormOff 8 + A1 I) TempNormOff 8 + A2 I) LONG MOVE,

  D7 MAX.TYPE.POINTS CMPI, MI IF,
    3POINT.LENGTH # A2 LONG ADDA,
    D7 1 LONG ADDQ,
  THEN, ;



PROC.START

CODE ADD.HITHER.CLIP.POINT
  >R,
  8           \ x is second.point
  4           \ y is first.point
  0 +HITHERPLANE    \ hitherplane is clip.offset
    0           \ z is scale.point
  ADD.CLIP.POINT
  R>,
  RTS, END-CODE
```

```
PROC.END

PROC.START

CODE CLIP.HITHER.VERT
>R,
  SAVE.REGS
  0 d7 moveq,
  0 D3 MOVEQ,
  0 +SHADEPOINTS A1 PBMove,
  0 +TEMPSHADE A2 PBMove,
  0 -POLYPOINTS# A0 PBMove,
  A0 () D5 LONG MOVE,
  0 +HITHERPLANE A0 PBMove,
  A0 () D4 LONG MOVE,
  D4 LONG NEG,
  D5 1 LONG SUBQ, PL IF,              \ if more then 1 point...
    3POINT.LENGTH D0 MOVEQ,
    D5 D0 MULS,
    D0 0 LONG A1 @I) D4 LONG CMP, PL IF,      \ test and set last point
      0 D6 MOVEQ,
    ELSE,
      -1 D6 MOVEQ,
    THEN,
    BEGIN,                        \ start loop to clip poly
      A1 () D4 LONG CMP, PL IF,
        D6 LONG TST, NE IF,
          ' ADD.HITHER.CLIP.POINT 4- BSR,  \ clip and add the point,
        THEN,
        D5 1 LONG SUBQ,
        0 D6 MOVEQ,               \ set the in flag and increment count
        3POINT.LENGTH # A1 LONG ADDA,      \ increment the poly point
        -1 D3 MOVEQ,              \ set init flag
      ELSE,
        D6 LONG TST, EQ IF,            \ if in bounds and last was out
          ' ADD.HITHER.CLIP.POINT 4- BSR,   \ clip and add the point, no increment
        ELSE,
          ADD.POINT,              \ if in bounds and last was in, add point
          D5 1 LONG SUBQ,           \ increment the count
          3POINT.LENGTH # A1 LONG ADDA,     \ increment the poly point
          -1 D3 MOVEQ,            \ set init flag
        THEN,
        -1 D6 MOVEQ,              \ set the out flag
      THEN,
    D5 LONG TST, MI UNTIL,
  THEN,
  SET.POLY.POINTS,
  RESTORE.REGS
R>,
RTS, END-CODE

PROC.END

PROC.START

CODE POLY.HITHER.CLIP
>R,
  SAVE.REGS
  0 +POLYPOINTS# A0 PBMove,
  A0 () D6 LONG MOVE,
  0 -SHADEPOINTS A1 PBMove,
```

```
-8000000 # D0 LONG MOVE,
D6 1 LONG SUBQ,
PL IF,
  BEGIN,
    A1 () D0 LONG CMP, MI IF,         \ find the largest
      A1 () D0 LONG MOVE,
    THEN,
    3POINT.LENGTH # A1 LONG ADDA,
  D6 LOOP,
  0 +HITHERPLANE A0 PBMove,           \ if larger z is smaller
  A0 () D1 LONG MOVE,
  D1 LONG NEG,
  D1 D0 LONG CMP, GT IF,              \ than hither plane then we must draw
    0 +POLYPOINTS# A0 PBMove,
    A0 () D6 LONG MOVE,
    0 +SHADEPOINTS A1 PBMove,
    8000000 # D0 LONG MOVE,
    D6 1 LONG SUBQ,
    BEGIN,
      A1 () D0 LONG CMP, PL IF,       \ find small z
        A1 () D0 LONG MOVE,
      THEN,
      3POINT.LENGTH # A1 LONG ADDA,
    D6 LOOP,
    0 +HITHERPLANE A0 PBMove,         \ if smaller z is larger
    A0 () D1 LONG MOVE,
    D1 LONG NEG,
    D1 D0 LONG CMP, LT IF,            \ than hither plane then we must CLIP
      ' CLIP.HITHER.VERT 4- BSR,
    THEN,
  ELSE,
    0 +POLYPOINTS# A0 PBMove,
    0 +SHADEPOINTS A1 PBMove,
    0 # A0 () LONG MOVE,
    0 # A1 () LONG MOVE,
    0 # 4 A1 I) LONG MOVE,
    0 # 8 A1 I) LONG MOVE,
  THEN,
 THEN,
RESTORE.REGS
R>,
RTS, END-CODE

PROC.END


PROC.START

CODE ADD.YON.CLIP.POINT
  >R,
  8             \ x is second.point
  4             \ y is first.point
  0 +YONPLANE     \ yon is clip.offset
    0           \ z is scale.point
  ADD.CLIP.POINT
  R>,
  RTS, END-CODE

PROC.END


PROC.START
```

```
CODE CLIP.YON.VERT
>R,
  SAVE.REGS
  0 d7 moveq,
  0 D3 MOVEQ,
  0 +SHADEPOINTS A1 PBMove,
  0 +TEMPSHADE A2 PBMove,
  0 +POLYPOINTS# A0 PBMove,
  A0 () D5 LONG MOVE,
  0 +YONPLANE A0 PBMove,
  A0 () D4 LONG MOVE,
  D5 1 LONG SUBQ, PL IF,              \ if more then 1 point...
    3POINT.LENGTH D0 MOVEQ,
    D5 D0 MULS,
    D0 0 LONG A1 @I) D4 LONG CMP, MI IF,    \ test and set last point
      0 D6 MOVEQ,
    ELSE,
      -1 D6 MOVEQ,
    THEN,
    BEGIN,                     \ start loop to clip poly
      A1 () D4 LONG CMP, MI IF,
        D6 LONG TST, NE IF,
          ' ADD.YON.CLIP.POINT 4- BSR, \ clip and add the point,
        THEN,
        D5 1 LONG SUBQ,
        0 D6 MOVEQ,             \ set the in flag and increment count
        3POINT.LENGTH # A1 LONG ADDA,     \ increment the poly point
        -1 D3 MOVEQ,            \ set init flag
      ELSE,
        D6 LONG TST, EQ IF,         \ if in bounds and last was out
          ' ADD.YON.CLIP.POINT 4- BSR,    \ clip and add the point, no increment
        ELSE,
          ADD.POINT,            \ if in bounds and last was in, add point
          D5 1 LONG SUBQ,         \ increment the count
          3POINT.LENGTH # A1 LONG ADDA,   \ increment the poly point
          -1 D3 MOVEQ,          \ set init flag
        THEN,
        -1 D6 MOVEQ,            \ set the out flag
      THEN,
    D5 LONG TST, MI UNTIL,
  THEN,
  SET.POLY.POINTS,
  RESTORE.REGS
R>,
RTS, END-CODE

PROC.END


  PROC.START

CODE POLY.YON.CLIP
>R,
  SAVE.REGS
  0 +POLYPOINTS# A0 PBMove,
  A0 () D6 LONG MOVE,
  0 +SHADEPOINTS A1 PBMove,
  -8000000 # D0 LONG MOVE,
  D6 1 LONG SUBQ,
  PL IF,
    BEGIN,
      A1 () D0 LONG CMP, PL IF,        \ find the smallest
        A1 () D0 LONG MOVE,
```

```
      THEN,
      3POINT.LENGTH # A1 LONG ADDA,
    D6 LOOP,
    0 +YONPLANE A0 PBMove,              \ if Smaller z is larger
    A0 () D1 LONG MOVE,
    D1 D0 LONG CMP, LT IF,                \ than yon plane then we must draw
      0 +POLYPOINTS# A0 PBMove,
      A0 () D6 LONG MOVE,
      0 +SHADEPOINTS A1 PBMove,
      8000000 # D0 LONG MOVE,
      D6 1 LONG SUBQ,
      BEGIN,
        A1 () D0 LONG CMP, MI IF,        \ find large z
          A1 () D0 LONG MOVE,
        THEN,
        3POINT.LENGTH # A1 LONG ADDA,
      D6 LOOP,
      0 +YONPLANE A0 PBMove,            \ if large z is smaller
      A0 () D1 LONG MOVE,
      D1 D0 LONG CMP, GT IF,              \ than hither plane then we must CLIP
        ' CLIP.YON.VERT 4- BSR,
      THEN,
    ELSE,
      0 +POLYPOINTS# A0 PBMove,
      0 +SHADEPOINTS A1 PBMove,
      0 # A0 () LONG MOVE,
      0 # A1 () LONG MOVE,
      0 # 4 A1 I) LONG MOVE,
      0 # 8 A1 I) LONG MOVE,
    THEN,
  THEN,
RESTORE.REGS
R>,
RTS, END-CODE

PROC.END


PROC.START

CODE ADD.LEFT.CLIP.POINT
  >R,
  4            \ Y is second.point
  0            \ Z is first.point
  0 +LEFTPLANE     \ LEFTPLANE is clip.offset
    8            \ X is scale.point
  ADD.CLIP.POINT
  R>,
  RTS, END-CODE

PROC.END


  PROC.START

CODE CLIP.LEFT.VERT
>R,
  SAVE.REGS
  0 d7 moveq,
  0 D3 MOVEQ,
  0 +SHADEPOINTS A1 PBMove,
  0 +TEMPSHADE A2 PBMove,
  0 +POLYPOINTS# A0 PBMove,
```

```
A0 () D5 LONG MOVE,
0 +LEFTPLANE A0 PBMove,
A0 () D4 LONG MOVE,
D5 1 LONG SUBQ, PL IF,                  \ if more then 1 point...
  3POINT.LENGTH D0 MOVEQ,
  D5 D0 MULS,
  D0 8 LONG A1 @I) D4 LONG CMP, PL IF,        \ test and set last point
    0 D6 MOVEQ,
  ELSE,
    -1 D6 MOVEQ,
  THEN,
  BEGIN,                         \ start loop to clip poly
    8 A1 I) D4 LONG CMP, PL IF,
      D6 LONG TST, NE IF,
        ' ADD.LEFT.CLIP.POINT 4- BSR,     \ clip and add the point,
      THEN,
      D5 1 LONG SUBQ,
      0 D6 MOVEQ,                \ set the in flag and increment count
      3POINT.LENGTH # A1 LONG ADDA,       \ increment the poly point
      -1 D3 MOVEQ,               \ set init flag
    ELSE,
      D6 LONG TST, EQ IF,            \ if in bounds and last was out
        ' ADD.LEFT.CLIP.POINT 4- BSR,   \ clip and add the point, no increment
      ELSE,
        ADD.POINT,               \ if in bounds and last was in, add point
        D5 1 LONG SUBQ,            \ increment the count
        3POINT.LENGTH # A1 LONG ADDA,     \ increment the poly point
        -1 D3 MOVEQ,             \ set init flag
      THEN,
      -1 D6 MOVEQ,               \ set the out flag
    THEN,
  D5 LONG TST, MI UNTIL,
THEN,
SET.POLY.POINTS,
RESTORE.REGS
R>,
RTS, END-CODE

PROC.END


PROC.START

CODE POLY.LEFT.CLIP
>R,
  SAVE.REGS
  0 +POLYPOINTS# A0 PBMove,
  A0 () D6 LONG MOVE,
  0 +SHADEPOINTS A1 PBMove,
  -8000000 # D0 LONG MOVE,
  D6 1 LONG SUBQ,
  PL IF,
    BEGIN,
      8 A1 I) D0 LONG CMP, MI IF,        \ find the largest x
        8 A1 I) D0 LONG MOVE,
      THEN,
      3POINT.LENGTH # A1 LONG ADDA,
    D6 LOOP,
    0 +LEFTPLANE A0 PBMove,             \ if larger x is larger than
    A0 () D1 LONG MOVE,
    D1 D0 LONG CMP, GT IF,               \ than left plane then we must draw
      0 +POLYPOINTS# A0 PBMove,
      A0 () D6 LONG MOVE,
```

```
      0 +SHADEPOINTS A1 PBMove,
      8000000 # D0 LONG MOVE,
      D6 1 LONG SUBQ,
      BEGIN,
        8 A1 I) D0 LONG CMP, PL IF,        \ find small x
          8 A1 I) D0 LONG MOVE,
        THEN,
        3POINT.LENGTH # A1 LONG ADDA,
      D6 LOOP,
      0 +LEFTPLANE A0 PBMove,             \ if smaller x is smaller
      A0 () D1 LONG MOVE,
      D1 D0 LONG CMP, LT IF,               \ than hither plane then we must Clip
        ' CLIP.LEFT.VERT 4- BSR,
      THEN,
    ELSE,
      0 +POLYPOINTS# A0 PBMove,
      0 +SHADEPOINTS A1 PBMove,
      0 # A0 () LONG MOVE,
      0 # A1 () LONG MOVE,
      0 # 4 A1 I) LONG MOVE,
      0 # 8 A1 I) LONG MOVE,
    THEN,
  THEN,
RESTORE.REGS
R>,
RTS, END-CODE

PROC.END


PROC.START

CODE ADD.RIGHT.CLIP.POINT
  >R,
  4            \ Y is second.point
  0            \ Z is first.point
  0 +RIGHTPLANE      \ LEFTPLANE is clip.offset
    8            \ X is scale.point
  ADD.CLIP.POINT
  R>,
  RTS, END-CODE

PROC.END


PROC.START

CODE CLIP.RIGHT.VERT
>R,
  SAVE.REGS
  0 d7 moveq,
  0 D3 MOVEQ,
  0 -SHADEPOINTS A1 PBMove,
  0 +TEMPSHADE A2 PBMove,
  0 +POLYPOINTS# A0 PBMove,
  A0 () D5 LONG MOVE,
  0 +RIGHTPLANE A0 PBMove,
  A0 () D4 LONG MOVE,
  D5 1 LONG SUBQ, PL IF,                \ if more then 1 point...
    3POINT.LENGTH D0 MOVEQ,
    D5 D0 MULS,
    D0 8 LONG A1 @I) D4 LONG CMP, MI IF,      \ test and set last point
      0 D6 MOVEQ,
    ELSE,
```

```
    -1 D6 MOVEQ,
   THEN,
   BEGIN,                          \ start loop to clip poly
     8 A1 I) D4 LONG CMP, MI IF,
       D6 LONG TST, NE IF,
          ' ADD.RIGHT.CLIP.POINT 4- BSR,    \ clip and add the point,
       THEN,
       D5 1 LONG SUBQ,
       0 D6 MOVEQ,               \ set the in flag and increment count
       3POINT.LENGTH # A1 LONG ADDA,       \ increment the poly point
       -1 D3 MOVEQ,              \ set init flag
     ELSE,
       D6 LONG TST, EQ IF,           \ if in bounds and last was out
         ' ADD.RIGHT.CLIP.POINT 4- BSR,    \ clip and add the point, no increment
       ELSE,
         ADD.POINT,              \ if in bounds and last was in, add point
         D5 1 LONG SUBQ,           \ increment the count
         3POINT.LENGTH # A1 LONG ADDA,     \ increment the poly point
         -1 D3 MOVEQ,            \ set init flag
       THEN,
       -1 D6 MOVEQ,              \ set the out flag
     THEN,
    D5 LONG TST, MI UNTIL,
  THEN,
  SET.POLY.POINTS,
  RESTORE.REGS
R>,
RTS, END-CODE

PROC.END



  PROC.START

CODE POLY.RIGHT.CLIP
>R,
  SAVE.REGS
  0 +POLYPOINTS# A0 PBMove,
  A0 () D6 LONG MOVE,
  0 +SHADEPOINTS A1 PBMove,
  -8000000 # D0 LONG MOVE,
  D6 1 LONG SUBQ,
  PL IF,
    BEGIN,
      8 A1 I) D0 LONG CMP, PL IF,          \ find the smallest x
        8 A1 I) D0 LONG MOVE,
      THEN,
      3POINT.LENGTH # A1 LONG ADDA,
    D6 LOOP,
    0 +RIGHTPLANE A0 PBMove,            \ if small x is smaller than
    A0 () D1 LONG MOVE,
    D1 D0 LONG CMP, LT IF,                \ than right plane then we must draw
      0 +POLYPOINTS# A0 PBMove,
      A0 () D6 LONG MOVE,
      0 +SHADEPOINTS A1 PBMove,
      8000000 # D0 LONG MOVE,
      D6 1 LONG SUBQ,
      BEGIN,
        8 A1 I) D0 LONG CMP, MI IF,       \ find large x
          8 A1 I) D0 LONG MOVE,
        THEN,
        3POINT.LENGTH # A1 LONG ADDA,
      D6 LOOP,
```

```
      0 +RIGHTPLANE A0 PBMove,          \ if large x is larger
      A0 () D1 LONG MOVE,
      D1 D0 LONG CMP, GT IF,            \ than right plane then we must CLIP
        ' CLIP.RIGHT.VERT 4- BSR,
      THEN,
    ELSE,
      0 +POLYPOINTS# A0 PBMove,
      0 +SHADEPOINTS A1 PBMove,
      0 # A0 () LONG MOVE,
      0 # A1 () LONG MOVE,
      0 # 4 A1 I) LONG MOVE,
      0 # 8 A1 I) LONG MOVE,
    THEN,
  THEN,
RESTORE.REGS
R>,
RTS, END-CODE

PROC.END


PROC.START

CODE ADD.TOP.CLIP.POINT
  >R,
  8            \ X is second.point
  0            \ Z is first.point
  0 +TOPPLANE    \ LEFTPLANE is clip.offset
    4          \ Y is scale.point
  ADD.CLIP.POINT
  R>,
  RTS, END-CODE

PROC.END


  PROC.START

CODE CLIP.TOP.VERT
>R,
  SAVE.REGS
  0 d7 moveq,
  0 D3 MOVEQ,
  0 +SHADEPOINTS A1 PBMove,
  0 +TEMPSHADE A2 PBMove,
  0 +POLYPOINTS# A0 PBMove,
  A0 () D5 LONG MOVE,
  0 +TOPPLANE A0 PBMove,
  A0 () D4 LONG MOVE,
  D5 1 LONG SUBQ, PL IF,                \ if more then 1 point...
    3POINT.LENGTH D0 MOVEQ,
    D5 D0 MULS,
    D0 4 LONG A1 @I) D4 LONG CMP, PL IF,      \ test and set last point
      0 D6 MOVEQ,
    ELSE,
      -1 D6 MOVEQ,
    THEN,
    BEGIN,                        \ start loop to clip poly
      4 A1 I) D4 LONG CMP, PL IF,
        D6 LONG TST, NE IF,
          ' ADD.TOP.CLIP.POINT 4- BSR,    \ clip and add the point,
        THEN,
        D5 1 LONG SUBQ,
```

```
      0 D6 MOVEQ,                \ set the in flag and increment count
      3POINT.LENGTH # A1 LONG ADDA,      \ increment the poly point
      -1 D3 MOVEQ,               \ set init flag
    ELSE,
      D6 LONG TST, EQ IF,            \ if in bounds and last was out
        ' ADD.TOP.CLIP.POINT 4- BSR,    \ clip and add the point, no increment
      ELSE,
        ADD.POINT,               \ if in bounds and last was in, add point
        D5 1 LONG SUBQ,            \ increment the count
        3POINT.LENGTH # A1 LONG ADDA,     \ increment the poly point
        -1 D3 MOVEQ,             \ set init flag
      THEN,
      -1 D6 MOVEQ,               \ set the out flag
    THEN,
   D5 LONG TST, MI UNTIL,
 THEN,
 SET.POLY.POINTS,
 RESTORE.REGS
R>,
RTS, END-CODE

PROC.END


 PROC.START

CODE POLY.TOP.CLIP
>R,
 SAVE.REGS
 0 +POLYPOINTS# A0 PBMove,
 A0 () D6 LONG MOVE,
 0 +SHADEPOINTS A1 PBMove,
 -8000000 # D0 LONG MOVE,
 D6 1 LONG SUBQ,
 PL IF,
   BEGIN,
     4 A1 I) D0 LONG CMP, MI IF,          \ find the largest y
       4 A1 I) D0 LONG MOVE,
     THEN,
     3POINT.LENGTH # A1 LONG ADDA,
   D6 LOOP,
   0 +TOPPLANE A0 PBMove,            \ if larger x is larger than
   A0 () D1 LONG MOVE,
   D1 D0 LONG CMP, GT IF,             \ than left plane then we must draw
     0 +POLYPOINTS# A0 PBMove,
     A0 () D6 LONG MOVE,
     0 +SHADEPOINTS A1 PBMove,
     8000000 # D0 LONG MOVE,
     D6 1 LONG SUBQ,
     BEGIN,
       4 A1 I) D0 LONG CMP, PL IF,        \ find small y
         4 A1 I) D0 LONG MOVE,
       THEN,
       3POINT.LENGTH # A1 LONG ADDA,
     D6 LOOP,
     0 +TOPPLANE A0 PBMove,           \ if smaller x is smaller
     A0 () D1 LONG MOVE,
     D1 D0 LONG CMP, LT IF,            \ than nither plane then we must Clip
       ' CLIP.TOP.VERT 4- BSR,
     THEN,
   ELSE,
     0 +POLYPOINTS# A0 PBMove,
     0 +SHADEPOINTS A1 PBMove,
```

```
      0 # A0 () LONG MOVE,
      0 # A1 () LONG MOVE,
      0 # 4 A1 I) LONG MOVE,
      0 # 8 A1 I) LONG MOVE,
    THEN,
  THEN,
RESTORE.REGS
R>,
RTS, END-CODE

PROC.END


PROC.START

CODE ADD.BOTTOM.CLIP.POINT
  >R,
  8           \ X is second.point
  0           \ Z is first.point
  0 +BOTTOMPLANE    \ LEFTPLANE is clip.offset
    4          \ Y is scale.point
  ADD.CLIP.POINT
  R>,
  RTS, END-CODE

PROC.END


  PROC.START

CODE CLIP.BOTTOM.VERT
>R,
  SAVE.REGS
  0 d7 moveq,
  0 D3 MOVEQ,
  0 +SHADEPOINTS A1 PBMove,
  0 +TEMPSHADE A2 PBMove,
  0 +POLYPOINTS# A0 PBMove,
  A0 () D5 LONG MOVE,
  0 +BOTTOMPLANE A0 PBMove,
  A0 () D4 LONG MOVE,
  D5 1 LONG SUBQ, PL IF,                    \ if more then 1 point...
    3POINT.LENGTH D0 MOVEQ,
    D5 D0 MULS,
    D0 4 LONG A1 @I) D4 LONG CMP, MI IF,       \ test and set last point
      0 D6 MOVEQ,
    ELSE,
      -1 D6 MOVEQ,
    THEN,
    BEGIN,                          \ start loop to clip poly
      4 A1 I) D4 LONG CMP, MI IF,
        D6 LONG TST, NE IF,
            ' ADD.BOTTOM.CLIP.POINT 4- BSR,  \ clip and add the point,
        THEN,
        D5 1 LONG SUBQ,
        0 D6 MOVEQ,                 \ set the in flag and increment count
        3POINT.LENGTH # A1 LONG ADDA,        \ increment the poly point
        -1 D3 MOVEQ,                \ set init flag
      ELSE,
        D6 LONG TST, EQ IF,             \ if in bounds and last was out
          ' ADD.BOTTOM.CLIP.POINT 4- BSR,   \ clip and add the point, no increment
        ELSE,
          ADD.POINT,                \ if in bounds and last was in, add point
          D5 1 LONG SUBQ,             \ increment the count
```

```
        3POINT.LENGTH # A1 LONG ADDA,       \ increment the poly point
        -1 D3 MOVEQ,              \ set init flag
      THEN,
      -1 D6 MOVEQ,                \ set the out flag
    THEN,
  D5 LONG TST, MI UNTIL,
 THEN,
 SET.POLY.POINTS,
 RESTORE.REGS
R>,
RTS, END-CODE

PROC.END


 PROC.START

CODE POLY.BOTTOM.CLIP
>R,
 SAVE.REGS
 0 +POLYPOINTS# A0 PBMove,
 A0 () D6 LONG MOVE,
 0 +SHADEPOINTS A1 PBMove,
 -8000000 # D0 LONG MOVE,
 D6 1 LONG SUBQ,
 PL IF,
   BEGIN,
     4 A1 I) D0 LONG CMP, PL IF,          \ find the smallest Y
       4 A1 I) D0 LONG MOVE,
     THEN,
     3POINT.LENGTH # A1 LONG ADDA,
   D6 LOOP,
   0 +BOTTOMPLANE A0 PBMove,            \ if small Y is smaller than
   A0 () D1 LONG MOVE,
   D1 D0 LONG CMP, LT IF,               \ than bottom plane then we must draw
     0 +POLYPOINTS# A0 PBMove,
     A0 () D6 LONG MOVE,
     0 +SHADEPOINTS A1 PBMove,
     8000000 # D0 LONG MOVE,
     D6 1 LONG SUBQ,
     BEGIN,
       4 A1 I) D0 LONG CMP, MI IF,      \ find large y
         4 A1 I) D0 LONG MOVE,
       THEN,
       3POINT.LENGTH # A1 LONG ADDA,
     D6 LOOP,
     0 +BOTTOMPLANE A0 PBMove,          \ if large y is larger
     A0 () D1 LONG MOVE,
     D1 D0 LONG CMP, GT IF,             \ than bottom plane then we must clip
       ' CLIP.BOTTOM.VERT 4- BSR,
     THEN,
   ELSE,
     0 +POLYPOINTS# A0 PBMove,
     0 +SHADEPOINTS A1 PBMove,
     0 # A0 () LONG MOVE,
     0 # A1 () LONG MOVE,
     0 # 4 A1 I) LONG MOVE,
     0 # 8 A1 I) LONG MOVE,
   THEN,
 THEN,
RESTORE.REGS
R>,
RTS, END-CODE
```

```
PROC.END

PROC.START

CODE (TRANS.POINT)                          \ shunts poly.points
 >R,
  0 +POLYCLIP? A6 I) D0 LONG MOVE,
NE IF,
    D0 HITHERCLIP YONCLIP OR LONG ANDI, NE IF,
      0 +POLYCLIP? A6 I) D0 LONG MOVE,
      D0 HITHERCLIP LONG ANDI, NE IF,
        ' POLY.HITHER.CLIP 4- BSR,
    THEN,
      0 +POLYCLIP? A6 I) D0 LONG MOVE,
      D0 yonclip LONG ANDI, NE IF,
        ' POLY.YON.CLIP 4- BSR,
    THEN,
    ' PROJECT.CLIP.POINTS 4- BSR,
  THEN,
  ' POLY.RIGHT.CLIP   4- BSR,
  ' POLY.LEFT.CLIP  4- BSR,
  ' POLY.TOP.CLIP   4- BSR,
  ' POLY.BOTTOM.CLIP  4- BSR,
 THEN,
 0 +ALIAS? A0 PBMove,
 A0 () LONG TST,
 EQ IF.L,
   0 +POLYPOINTS# A0 PBMove,
     A0 () D3 LONG MOVE,
      D3 1 LONG SUBQ,
     PL IF.L,
     0 +POLYPOINTS A2 PBMove,
   0 +SHADEPOINTS A0 PBMove,
   0 +ZBUFFSCALE A1 PBMove,
   A1 () D6 LONG MOVE,
     BEGIN,
     9 D1 MOVEQ,
     NORMOFF A0 I) D0 LONG MOVE,        \ scale the normal.points
       D0 D1 LONG ASR,
       D0 LONG NEG,
     D0 NORMOFF A0 I) LONG MOVE,
     NORMOFF 4+ A0 I) D0 LONG MOVE,
       D0 D1 LONG ASR,
       D0 LONG NEG,
     D0 NORMOFF 4+ A0 I) LONG MOVE,
     NORMOFF 8 + A0 I) D0 LONG MOVE,
       D0 D1 LONG ASR,
     D0 NORMOFF 8 + A0 I) LONG MOVE,
     A0 () D0 LONG MOVE,
     4 A0 I) D1 LONG MOVE,
     8 A0 I) D2 LONG MOVE,
     D6 LONG TST, PL IF,
         D0 D6 LONG ASR,
       ELSE,
       D6 D4 LONG MOVE,
       D4 LONG NEG,
       D0 D4 LONG ASL,
      THEN,
      0 +YALIASOFFSET A1 PBMove,
      A1 () D1 LONG ADD,
      0 +XALIASOFFSET A1 PBMove,
      A1 () D2 LONG ADD,
```

```
      FIX>INTEGER,
    0 -YOFFSET A1 PBMove,
    A1 () D1 LONG ADD,
    0 +XOFFSET A1 PBMove,
    A1 () D2 LONG ADD,
    D0 A2 () LONG MOVE,
    D1 4 A2 I) LONG MOVE,
    D2 8 A2 I) LONG MOVE,
    12 # A2 LONG ADDA,
    12 # A0 LONG ADDA,
    D3 LOOP,
    THEN,
ELSE.L,
  0 +POLYPOINTS# A0 PBMove,
    A0 () D3 LONG MOVE,
     D3 1 LONG SUBQ,
    PL IF.L,
    0 +POLYPOINTS A2 PBMove,
  0 -SHADEPOINTS A0 PBMove,
  0 +ZBUFFSCALE A1 PBMove,
  A1 () D6 LONG MOVE,
    BEGIN,
    7 D1 MOVEQ,              \ scale the normal points
    NORMOFF A0 I) D0 LONG MOVE,
      D0 D1 LONG ASR,
      D0 LONG NEG,
    D0 NORMOFF A0 I) LONG MOVE,
    NORMOFF 4+ A0 I) D0 LONG MOVE,
      D0 D1 LONG ASR,
      D0 LONG NEG,
    D0 NORMOFF 4+ A0 I) LONG MOVE,
    NORMOFF 8 + A0 I) D0 LONG MOVE,
      D0 D1 LONG ASR,
    D0 NORMOFF 8 + A0 I) LONG MOVE,
      A0 () D0 LONG MOVE,
    4 A0 I) D1 LONG MOVE,
    8 A0 I) D2 LONG MOVE,
    D6 LONG TST, PL IF,
        D0 D6 LONG ASR,
      ELSE,
      D6 D4 LONG MOVE,
      D4 LONG NEG,
      D0 D4 LONG ASL,
    THEN,
    0 +YALIASOFFSET A1 PBMove,
    A1 () D1 LONG ADD,
    0 +XALIASOFFSET A1 PBMove,
    A1 () D2 LONG ADD,
      ALIAS.FIX>INTEGER,
    0 +YOFFSET A1 PBMove,
    A1 () D4 LONG MOVE,
    D4 2 # LONG ASL,
    D4 D1 LONG ADD,
    0 +XOFFSET A1 PBMove,
    A1 () D4 LONG MOVE,
    D4 2 # LONG ASL,
    D4 D2 LONG ADD,
    D0 A2 () LONG MOVE,
    D1 4 A2 I) LONG MOVE,
    D2 8 A2 I) LONG MOVE,
    12 # A2 LONG ADDA,
    12 # A0 LONG ADDA,
    D3 LOOP,
    THEN,
```

```
THEN,
R>, RTS,  END-CODE

PROC.END


PROC.START

CODE (JUST.TRANS.CLIP)                          \ shunts poly.points
>R,
  0 +POLYCLIP? A6 I) D0 LONG MOVE,
NE IF,
    D0 HITHERCLIP YONCLIP OR LONG ANDI, NE IF,
      0 +POLYCLIP? A6 I) D0 LONG MOVE,
      D0 HITHERCLIP LONG ANDI, NE IF,
        ' POLY.HITHER.CLIP 4- BSR,
    THEN,
      0 +POLYCLIP? A6 I) D0 LONG MOVE,
      D0 yonclip LONG ANDI, NE IF,
        ' POLY.YON.CLIP 4- BSR,
    THEN,
    ' PROJECT.CLIP.POINTS 4- BSR,
  THEN,
  ' POLY.RIGHT.CLIP   4- BSR,
  ' POLY.LEFT.CLIP  4- BSR,
  ' POLY.TOP.CLIP   4- BSR,
  ' POLY.BOTTOM.CLIP  4- BSR,
  THEN,
  0 +POLYPOINTS# A0 PBMove,
  A0 () D3 LONG MOVE,
  D3 1 LONG SUBQ,
  PL IF,
  0 +ZBUFFSCALE A1 PBMove,
    0 +POLYPOINTS A2 PBMove,
  0 +SHADEPOINTS A0 PBMove,
    BEGIN,
    a1 () D4 LONG MOVE,
      A0 () D0 LONG MOVE,
    4 A0 I) D1 LONG MOVE,
    8 A0 I) D2 LONG MOVE,
    D4 LONG TST, PL IF,
        D0 D4 LONG ASR,
      ELSE,
      D4 LONG NEG,
      D0 D4 LONG ASL,
    THEN,
    D0 A2 () LONG MOVE,
    D1 4 A2 I) LONG MOVE,
    D2 8 A2 I) LONG MOVE,
    12 # A2 LONG ADDA,
    12 # A0 LONG ADDA,
    D3 LOOP,
  THEN,
  R>, RTS, END-CODE

PROC.END


PROC.START

CODE (MAXY.SORT)                      \ finds maximum y scanline
>R,
```

```
0 +POLYPOINTS A0 PBMove,             \ A0 is Poly.Points
0 +POLYPOINTS# A6 I) D2 LONG MOVE,        \ d2 is number of points
4 A0 I) D0 LONG MOVE,                \ set first point
12 # A0 LONG ADDA,
D2 2 LONG SUBQ, PL IF,               \ if non zero ...
  BEGIN,
    4 A0 I) D0 LONG CMP, MI IF,
      4 A0 I) D0 LONG MOVE,
    THEN,
  12 # A0 LONG ADDA,
  D2 LOOP,
THEN,
0 +ALIAS? A0 PBMove,                \ if aliasing is turned on then
A0 () LONG TST, NE IF,               \ scale down by 2
  D0 2 # LONG ASR,
THEN,
 0 +TPOLYYMAX  A0 PBMove,             \ clip and store
   A0 () D0 LONG CMP, PL IF,
  A0 () D0 LONG MOVE,                \ check y max bounds
 THEN,
 TPOLY.YMIN TPOLY.YMAX - A0 I) D0 LONG CMP,
 MI IF,
  TPOLY.YMIN TPOLY.YMAX - A0 I)          \ check y min bounds
  D0 LONG MOVE,
 THEN,
  0 +YMAXSCAN  A0 PBMove,
D0 A0 () LONG MOVE,                 \ store result
R>,
RTS,  END-CODE

PROC.END


PROC.START

CODE (MINY.SORT)                    \ finds maximum y scanline
>R,
0 +POLYPOINTS A0 PBMove,             \ A0 is Poly.Points
0 +POLYPOINTS# A6 I) D2 LONG MOVE,        \ d2 is number of points
4 A0 I) D0 LONG MOVE,                \ set first point
12 # A0 LONG ADDA,
D2 2 LONG SUBQ, PL IF,               \ if non zero ...
  BEGIN,
    4 A0 I) D0 LONG CMP, PL IF,
      4 A0 I) D0 LONG MOVE,
    THEN,
  12 # A0 LONG ADDA,
  D2 LOOP,
THEN,
0 +ALIAS? A0 PBMove,                \ if aliasing is turned on then
A0 () LONG TST, NE IF,               \ scale down by 2
  D0 2 # LONG ASR,
THEN,
 0 +TPOLYYMAX  A0 PBMove,             \ clip and store
   A0 () D0 LONG CMP, PL IF,
  A0 () D0 LONG MOVE,                \ check y max bounds
 THEN,
 TPOLY.YMIN TPOLY.YMAX - A0 I) D0 LONG CMP,
 MI IF,
  TPOLY.YMIN TPOLY.YMAX - A0 I)          \ check y min bounds
  D0 LONG MOVE,
 THEN,
  0 +YBASESCAN  A0 PBMove,
```

```
D0 A0 () LONG MOVE,              \ store result
R>,
RTS,  END-CODE

PROC.END


PROC.START

CODE (MAXX.SORT)                 \ finds maximum y scanline
>R,
0 +POLYPOINTS A0 PBMove,           \ A0 is Poly.Points
0 +POLYPOINTS# A6 I) D2 LONG MOVE,        \ d2 is number of points
8 A0 I) D0 LONG MOVE,              \ set first point
12 # A0 LONG ADDA,
D2 2 LONG SUBQ, PL IF,             \ if non zero ...
  BEGIN,
    8 A0 I) D0 LONG CMP, MI IF,
      8 A0 I) D0 LONG MOVE,
    THEN,
  12 # A0 LONG ADDA,
  D2 LOOP,
THEN,
0 +ALIAS? A0 PBMove,             \ if aliasing is turned on then
A0 () LONG TST, NE IF,             \ scale down by 2
  D0 2 # LONG ASR,
THEN,
 0 +POLYXMAX  A0 PBMove,           \ clip and store
   A0 () D0 LONG CMP, PL IF,
  A0 () D0 LONG MOVE,            \ check y max bounds
 THEN,
 POLY.XMIN POLY.XMAX - A0 I) D0 LONG CMP,
 MI IF,
  TPOLY.XMIN TPOLY.XMAX - A0 I)        \ check y min bounds
  D0 LONG MOVE,
 THEN,
  0 +XMAXSCAN  A0 PBMove,
D0 A0 () LONG MOVE,              \ store result
R>,
RTS, END-CODE

PROC.END


PROC.START

CODE (MINX.SORT)               \ finds maximum y scanline
>R,
0 +POLYPOINTS A0 PBMove,          \ A0 is Poly.Points
0 +POLYPOINTS# A6 I) D2 LONG MOVE,      \ d2 is number of points
8 A0 I) D0 LONG MOVE,             \ set first point
12 # A0 LONG ADDA,
D2 2 LONG SUBQ, PL IF,            \ if non zero ...
  BEGIN,
    8 A0 I) D0 LONG CMP, PL IF,
      8 A0 I) D0 LONG MOVE,
    THEN,
  12 # A0 LONG ADDA,
  D2 LOOP,
THEN,
0 +ALIAS? A0 PBMove,             \ if aliasing is turned on then
A0 () LONG TST, NE IF,             \ scale down by 2
  D0 2 # LONG ASR,
```

```
THEN,
 0 +POLYXMAX  A0 PBMove,            \ clip and store
   A0 () D0 LONG CMP, PL IF,
  A0 () D0 LONG MOVE,               \ check y max bounds
 THEN,
 POLY.XMIN POLY.XMAX - A0 I) D0 LONG CMP,
 MI IF,
  TPOLY.XMIN TPOLY.XMAX - A0 I)        \ check y min bounds
  D0 LONG MOVE,
 THEN,
  0 +XBASESCAN  A0 PBMove,
D0 A0 () LONG MOVE,                 \ store result
R>,
RTS, END-CODE

PROC.END



PROC.START

  PROC.START

CODE (POLY.BOUNDS)
>R,
' (MAXY.SORT)  4 - BSR,
' (MINY.SORT)  4- BSR,
0 -YMAXSCAN A6 I) D0 LONG MOVE,
  0 +YBASESCAN A6 I) D0 LONG CMP, EQ IF,
  0 # 0 +POLYPOINTS# A6 I) LONG MOVE,
ELSE,
  ' (MAXX.SORT) 4- BSR,
  ' (MINX.SORT) 4- BSR,
  0 +XMAXSCAN A6 I) D0 LONG MOVE,
    0 +XBASESCAN A6 I) D0 LONG CMP, EQ IF,
    0 # 0 +POLYPOINTS# A6 I) LONG MOVE,
  THEN,
THEN,
R>, RTS, END-CODE

PROC.END
```

```
ANEW --POLYCLIP--

." loading clipping "

   PROC.START

  CODE CLIP.PROJECT
  >R,
  0 +ORTHOGRAPHIC A0 PBMOVE,
  A0 () LONG TST, EQ IF,
    D4 RPUSH,
    D5 RPUSH,
    D0 D5 LONG MOVE,           \ save Z fixed point TO D5
    0 +CDISTANCE A1 PBMOVE,
    A1 () D4 LONG MOVE,
    D4 D3 LONG MOVE,
    D0 D4 LONG ADD,            \ add fixed viewing distance
    D4  40 10 SCALE LONG CMPI, MI IF,
        40 10 SCALE # D4 LONG MOVE,   \ clip z to near threshold
    THEN,
    D1 D3 D4 LONG.MUL.DIV,
    D2 D3 D4 LONG.MUL.DIV,
    D5 D3 D4 LONG.MUL.DIV,
    D5 D0 LONG MOVE,
   D5 RPOP,
   D4 RPOP,
   THEN,
  R>,
  RTS, END-CODE

  PROC.END


  FIX.SCALE 2- CONSTANT ALIAS.SCALE
  1  ALIAS.SCALE SCALE CONSTANT ALIAS.SCALE/2

  0 +tempnormalpoints 0 +TempShade - constant TempNormOff
  0 +normalpoints   0 +shadepoints - constant NormOff


  : FIX.AROUND,  ASSEMBLER
    REG1 2!
    REG1 2@ LONG TST, MI IF,
      REG1 2@ LONG NEG,
      REG1 2@ ALIAS.SCALE/2 LONG ADDI,
      REG1 2@ D3 LONG ASR,
      REG1 2@ WORD.RANGE LONG CMPI, PL IF,
        WORD.RANGE # REG1 2@ LONG MOVE,
      THEN,
      REG1 2@ LONG NEG,
    ELSE,
      REG1 2@ ALIAS.SCALE/2 LONG ADDI,
      REG1 2@ D3 LONG ASR,
      REG1 2@ WORD.RANGE LONG CMPI, PL IF,
        WORD.RANGE # REG1 2@ LONG MOVE,
      THEN,
    THEN, ;

   DECIMAL
```

```
: ALIAS.FIX>INTEGER, ASSEMBLER
 D3 RPUSH,
 ALIAS.SCALE D3 MOVEQ,
 D0  FIX.AROUND,
 D1  FIX.AROUND,
 D2  FIX.AROUND,
 D3 RPOP, ;


:  ADD.CLIP.POINT  ASSEMBLER
 locals| scale.point clip.offset first.point second.point

 REGLIST D0-D7/A0-A2 RP -) LONG MOVEM,    \ save regs
   D3 LONG TST, EQ IF,
     0 +POLYPOINTS# A0 PBMove,         \ set index to points
     A0 () D1 LONG MOVE,
     D1 1 LONG SUBQ,
     3POINT.LENGTH D2 MOVEQ,
     D1 D2 MULS,
     0  D3 MOVEQ,
   ELSE,
     3POINT.LENGTH -1 *  D2 MOVEQ,
     0 D3 MOVEQ,
   THEN,
   D2 SCALE.POINT LONG A1 @I) D0 LONG MOVE,
   D3 SCALE.POINT LONG A1 @I) D0 LONG CMP, MI IF,
     D2 D3 EXG,
   THEN,

   D2 SCALE.POINT LONG A1 @I) D7 LONG MOVE,
   D3 SCALE.POINT LONG A1 @I) D7 LONG SUB,   \ d7 is scaler

   clip.offset A0 PBMove,           \ d6 is scalee
   A0 () D6  LONG MOVE,
   clip.offset 0 +HITHERPLANE = IF
     D6 LONG NEG,
   THEN
   D3 SCALE.POINT LONG A1 @I) D1 LONG MOVE,
   D1 D6 LONG SUB,

   D2 FIRST.POINT LONG A1 @I) D5 LONG MOVE,
   D3 FIRST.POINT LONG A1 @I) D5 LONG SUB,   \ d6 is firstpoint diff
   D5 D6 D7 LONG.MUL.DIV,            \ convert to fix.scale
   D3 FIRST.POINT LONG A1 @I) D5 LONG ADD,
   D5 FIRST.POINT A2 I) LONG MOVE,       \ use clipped firstpoint

   D2 SECOND.POINT LONG A1 @I) D5 LONG MOVE,
   D3 SECOND.POINT LONG A1 @I) D5 LONG SUB,  \ d5 is secondpoint diff
   D5 D6 D7 LONG.MUL.DIV,            \ convert to fix.scale
   D3 SECOND.POINT LONG A1 @I) D5 LONG ADD,
   D5 SECOND.POINT A2 I) LONG MOVE,      \ use clipped secondpoint

   d2 normoff long addi,
   d3 normoff long addi,

   0 +POLYSELECT A6 I) D0 LONG MOVE,       \ test for phong rendering
   D0 PHONG 2 - 8 * LONG CMPI, EQ IF,
     D2  0 LONG A1 @I) D5 LONG MOVE,
     D3  0 LONG A1 @I) D5 LONG SUB,       \ d5 is normal x diff
     D5 D6 D7 LONG.MUL.DIV,
     D3  0 LONG A1 @I) D5 LONG ADD,
     D5 TEMPNORMOFF A2 I) LONG MOVE,      \ use clipped normal x

     D2  4 LONG A1 @I) D5 LONG MOVE,
```

```
    D3  4  LONG A1 @I) D5 LONG SUB,      \ d5 is normal y diff
    D5 D6 D7 LONG.MUL.DIV,
    D3  4  LONG A1 @I) D5 LONG ADD,
    D5 TEMPNORMOFF 4 + A2 I) LONG MOVE,    \ use clipped normal y
  THEN,

  clip.offset a6 I) D0 LONG MOVE,        \ make hitherplane neg here
  clip.offset 0 +HITHERPLANE = IF
    D0 LONG NEG,
  THEN
  D0 SCALE.POINT A2 I) LONG MOVE,        \ move in clipping plane

 RP )+ REGLIST D0-D7/A0-A2  LONG MOVEM,       \ restore regs

 D7 MAX.TYPE.POINTS CMPI, MI IF,
   3POINT.LENGTH # A2 LONG ADDA,
   D7 1 LONG ADDQ,
 THEN,
;

: SET.POLY.POINTS,  ASSEMBLER
 0 +POLYPOINTS# A0 PBMove,
 0 +SHADEPOINTS A1 PBMove,
 0 +TEMPSHADE A2 PBMove,
 D7 A0 () LONG MOVE,                  \ set new #polypoints
 D7 1 LONG SUBQ, PL IF,
   BEGIN,
     TEMPNORMOFF A2 I) NORMOFF A1 I) LONG MOVE,
     A2 )+ A1 )+ LONG MOVE,            \ set new shade.points
     TEMPNORMOFF A2 I) NORMOFF A1 I) LONG MOVE,
     A2 )+ A1 )+ LONG MOVE,
     TEMPNORMOFF A2 I) NORMOFF A1 I) LONG MOVE,
     A2 )+ A1 )+ LONG MOVE,
   D7 LOOP,
  THEN, ;


PROC.START

CODE TEST.CUBE
>R,
  0 +CUBEBOUNDS A0 PBMove,      \ max x
  A0 () D2 LONG CMP, PL IF,
    D2 A0 () LONG MOVE,
  THEN,
  4 A0 I) D2 LONG CMP, MI IF,   \ min x
    D2 4 A0 I) LONG MOVE,
  THEN,

  8 A0 I) D1 LONG CMP, PL IF,   \ max y
    D1 8 A0 I) LONG MOVE,
  THEN,
  12 A0 I) D1 LONG CMP, MI IF,  \ min y
    D1 12 A0 I) LONG MOVE,
  THEN,

  16 A0 I) D0 LONG CMP, PL IF,  \ max z
    D0 16 A0 I) LONG MOVE,
  THEN,
  20 A0 I) D0 LONG CMP, MI IF,  \ min z
    D0 20 A0 I) LONG MOVE,
  THEN,
 R>,
 RTS,
```

```
END-CODE

PROC.END

PROC.START

CODE PROJECT.CLIP.POINTS
  0 +POLYPOINTS# A0 PBMove,
    A0 () D6 LONG MOVE,
    0 +SHADEPOINTS A2 PBMove,
    D6 1 LONG SUBQ,
    PL IF,
      BEGIN,                    \ project the point
        A2 () D0 LONG MOVE,
        4 A2 I) D1 LONG MOVE,
        8 A2 I) D2 LONG MOVE,
        ' CLIP.PROJECT 4- BSR,
        ' TEST.CUBE 4- BSR,
        D0 A2 () LONG MOVE,
        D1 4 A2 I) LONG MOVE,
        D2 8 A2 I) LONG MOVE,
        3POINT.LENGTH # A2 LONG ADDA,
      D6 LOOP,
    THEN,
RTS, END-CODE

PROC.END


\ d7 is #temp.points
\ a2 is temp.points
\ a1 is poly.points
\ d6 is in flag


: ADD.POINT, assembler
  A1 () A2 () LONG MOVE,
  4 A1 I) 4 A2 I) LONG MOVE,
  8 A1 I) 8 A2 I) LONG MOVE,

  NormOff   A1 I) TempNormOff    A2 I) LONG MOVE,   \ move normal points ...
  NormOff 4 + A1 I) TempNormOff 4 + A2 I) LONG MOVE,
  NormOff 8 + A1 I) TempNormOff 8 + A2 I) LONG MOVE,

  D7 MAX.TYPE.POINTS CMPI, MI IF,
    3POINT.LENGTH # A2 LONG ADDA,
    D7 1 LONG ADDQ,
  THEN, ;



PROC.START

CODE ADD.HITHER.CLIP.POINT
  >R,
  8            \ x is second.point
  4            \ y is first.point
  0 +HITHERPLANE     \ hitherplane is clip.offset
    0            \ z is scale.point
  ADD.CLIP.POINT
  R>,
  RTS, END-CODE
```

```
PROC.END

PROC.START

CODE CLIP.HITHER.VERT
>R,
  SAVE.REGS
  0 d7 moveq,
  0 D3 MOVEQ,
  0 -SHADEPOINTS A1 PBMove,
  0 +TEMPSHADE A2 PBMove,
  0 +POLYPOINTS# A0 PBMove,
  A0 () D5 LONG MOVE,
  0 +HITHERPLANE A0 PBMove,
  A0 () D4 LONG MOVE,
  D4 LONG NEG,
  D5 1 LONG SUBQ, PL IF,                \ if more then 1 point...
    3POINT.LENGTH D0 MOVEQ,
    D5 D0 MULS,
    D0 0 LONG A1 @I) D4 LONG CMP, PL IF,      \ test and set last point
      0 D6 MOVEQ,
    ELSE,
      -1 D6 MOVEQ,
    THEN,
    BEGIN,                         \ start loop to clip poly
      A1 () D4 LONG CMP, PL IF,
        D6 LONG TST, NE IF,
          ' ADD.HITHER.CLIP.POINT 4- BSR,  \ clip and add the point,
        THEN,
        D5 1 LONG SUBQ,
        0 D6 MOVEQ,                \ set the in flag and increment count
        3POINT.LENGTH # A1 LONG ADDA,       \ increment the poly point
        -1 D3 MOVEQ,               \ set init flag
      ELSE,
        D6 LONG TST, EQ IF,            \ if in bounds and last was out
          ' ADD.HITHER.CLIP.POINT 4- BSR,    \ clip and add the point, no increment
        ELSE,
          ADD.POINT,               \ if in bounds and last was in, add point
          D5 1 LONG SUBQ,           \ increment the count
          3POINT.LENGTH # A1 LONG ADDA,     \ increment the poly point
          -1 D3 MOVEQ,             \ set init flag
        THEN,
        -1 D6 MOVEQ,               \ set the out flag
      THEN,
    D5 LONG TST, MI UNTIL,
  THEN,
  SET.POLY.POINTS,
  RESTORE.REGS
R>,
RTS, END-CODE

PROC.END


PROC.START

CODE POLY.HITHER.CLIP
>R,
  SAVE.REGS
  0 +POLYPOINTS# A0 PBMove,
  A0 () D6 LONG MOVE,
  0 +SHADEPOINTS A1 PBMove,
```

```
-8000000 # D0 LONG MOVE,
D6 1 LONG SUBQ,
PL IF,
  BEGIN,
    A1 () D0 LONG CMP, MI IF,          \ find the largest
      A1 () D0 LONG MOVE,
    THEN,
    3POINT.LENGTH # A1 LONG ADDA,
  D6 LOOP,
  0 +HITHERPLANE A0 PBMove,            \ if larger z is smaller
  A0 () D1 LONG MOVE,
  D1 LONG NEG,
  D1 D0 LONG CMP, GT IF,               \ than hither plane then we must draw
    0 +POLYPOINTS# A0 PBMove,
    A0 () D6 LONG MOVE,
    0 +SHADEPOINTS A1 PBMove,
    8000000 # D0 LONG MOVE,
    D6 1 LONG SUBQ,
    BEGIN,
      A1 () D0 LONG CMP, PL IF,        \ find small z
        A1 () D0 LONG MOVE,
      THEN,
      3POINT.LENGTH # A1 LONG ADDA,
    D6 LOOP,
    0 +HITHERPLANE A0 PBMove,          \ if smaller z is larger
    A0 () D1 LONG MOVE,
    D1 LONG NEG,
    D1 D0 LONG CMP, LT IF,             \ than hither plane then we must CLIP
      ' CLIP.HITHER.VERT 4- BSR,
    THEN,
  ELSE,
    0 +POLYPOINTS# A0 PBMove,
    0 +SHADEPOINTS A1 PBMove,
    0 # A0 () LONG MOVE,
    0 # A1 () LONG MOVE,
    0 # 4 A1 I) LONG MOVE,
    0 # 8 A1 I) LONG MOVE,
  THEN,
THEN,
RESTORE.REGS
R>,
RTS, END-CODE

PROC.END


PROC.START

CODE ADD.YON.CLIP.POINT
  >R,
  8              \ x is second.point
  4              \ y is first.point
  0 +YONPLANE    \ yon is clip.offset
   0             \ z is scale.point
  ADD.CLIP.POINT
  R>,
  RTS, END-CODE

PROC.END

PROC.START
```

```
CODE CLIP.YON.VERT
>R,
  SAVE.REGS
  0 d7 moveq,
  0 D3 MOVEQ,
  0 +SHADEPOINTS A1 PBMove,
  0 +TEMPSHADE A2 PBMove,
  0 +POLYPOINTS# A0 PBMove,
  A0 () D5 LONG MOVE,
  0 +YONPLANE A0 PBMove,
  A0 () D4 LONG MOVE,
  D5 1 LONG SUBQ, PL IF,              \ if more then 1 point...
    3POINT.LENGTH D0 MOVEQ,
    D5 D0 MULS,
    D0 0 LONG A1 @I) D4 LONG CMP, MI IF,     \ test and set last point
      0 D6 MOVEQ,
    ELSE,
      -1 D6 MOVEQ,
    THEN,
    BEGIN,                         \ start loop to clip poly
      A1 () D4 LONG CMP, MI IF,
        D6 LONG TST, NE IF,
          ' ADD.YON.CLIP.POINT 4- BSR, \ clip and add the point,
        THEN,
        D5 1 LONG SUBQ,
        0 D6 MOVEQ,                \ set the in flag and increment count
        3POINT.LENGTH # A1 LONG ADDA,     \ increment the poly point
        -1 D3 MOVEQ,               \ set init flag
      ELSE,
        D6 LONG TST, EQ IF,            \ if in bounds and last was out
          ' ADD.YON.CLIP.POINT 4- BSR,     \ clip and add the point, no increment
        ELSE,
          ADD.POINT,               \ if in bounds and last was in, add point
          D5 1 LONG SUBQ,          \ increment the count
          3POINT.LENGTH # A1 LONG ADDA,   \ increment the poly point
          -1 D3 MOVEQ,             \ set init flag
        THEN,
        -1 D6 MOVEQ,               \ set the out flag
      THEN,
    D5 LONG TST, MI UNTIL,
  THEN,
  SET.POLY.POINTS,
  RESTORE.REGS
R>,
RTS, END-CODE

PROC.END


  PROC.START

CODE POLY.YON.CLIP
>R,
  SAVE.REGS
  0 +POLYPOINTS# A0 PBMove,
  A0 () D6 LONG MOVE,
  0 +SHADEPOINTS A1 PBMove,
  -8000000 # D0 LONG MOVE,
  D6 1 LONG SUBQ,
  PL IF,
    BEGIN,
      A1 () D0 LONG CMP, PL IF,         \ find the smallest
        A1 () D0 LONG MOVE,
```

```
    THEN,
    3POINT.LENGTH # A1 LONG ADDA,
  D6 LOOP,
  0 -YONPLANE A0 PBMove,              \ if Smaller z is Larger
  A0 () D1 LONG MOVE,
  D1 D0 LONG CMP, LT IF,               \ than yon plane then we must draw
    0 +POLYPOINTS# A0 PBMove,
    A0 () D6 LONG MOVE,
    0 +SHADEPOINTS A1 PBMove,
    8000000 # D0 LONG MOVE,
    D6 1 LONG SUBQ,
    BEGIN,
      A1 () D0 LONG CMP, MI IF,        \ find large z
        A1 () D0 LONG MOVE,
      THEN,
      3POINT.LENGTH # A1 LONG ADDA,
    D6 LOOP,
    0 +YONPLANE A0 PBMove,            \ if large z is smaller
    A0 () D1 LONG MOVE,
    D1 D0 LONG CMP, GT IF,             \ than hither plane then we must Clip
      ' CLIP.YON.VERT 4- BSR,
    THEN,
  ELSE,
    0 +POLYPOINTS# A0 PBMove,
    0 +SHADEPOINTS A1 PBMove,
    0 # A0 () LONG MOVE,
    0 # A1 () LONG MOVE,
    0 # 4 A1 I) LONG MOVE,
    0 # 8 A1 I) LONG MOVE,
  THEN,
 THEN,
RESTORE.REGS
R>,
RTS, END-CODE

PROC.END


PROC.START

CODE ADD.LEFT.CLIP.POINT
  >R,
  4            \ Y is second.point
  0            \ Z is first.point
  0 +LEFTPLANE     \ LEFTPLANE is clip.offset
   8           \ X is scale.point
  ADD.CLIP.POINT
  R>,
  RTS, END-CODE

PROC.END


  PROC.START

CODE CLIP.LEFT.VERT
>R,
  SAVE.REGS
  0 d7 moveq,
  0 D3 MOVEQ,
  0 +SHADEPOINTS A1 PBMove,
  0 +TEMPSHADE A2 PBMove,
  0 +POLYPOINTS# A0 PBMove,
```

```
  AC () D5 LONG MOVE,
  0 +LEFTPLANE A0 PBMove,
  A0 () D4 LONG MOVE,
  D5 1 LONG SUBQ, PL IF,                  \ if more then 1 point...
    3POINT.LENGTH D0 MOVEQ,
    D5 D0 MULS,
    D0 8 LONG A1 @I) D4 LONG CMP, PL IF,      \ test and set last point
      0 D6 MOVEQ,
    ELSE,
      -1 D6 MOVEQ,
    THEN,
    BEGIN,                      \ start loop to clip poly
      8 A1 I) D4 LONG CMP, PL IF,
        D6 LONG TST, NE IF,
           ' ADD.LEFT.CLIP.POINT 4- BSR,    \ clip and add the point,
        THEN,
        D5 1 LONG SUBQ,
        0 D6 MOVEQ,                 \ set the in flag and increment count
        3POINT.LENGTH # A1 LONG ADDA,       \ increment the poly point
        -1 D3 MOVEQ,                \ set init flag
      ELSE,
        D6 LONG TST, EQ IF,             \ if in bounds and last was out
          ' ADD.LEFT.CLIP.POINT 4- BSR,   \ clip and add the point, no increment
        ELSE,
          ADD.POINT,                \ if in bounds and last was in, add point
          D5 1 LONG SUBQ,             \ increment the count
          3POINT.LENGTH # A1 LONG ADDA,      \ increment the poly point
          -1 D3 MOVEQ,              \ set init flag
        THEN,
        -1 D6 MOVEQ,                \ set the out flag
      THEN,
    D5 LONG TST, MI UNTIL,
  THEN,
  SET.POLY.POINTS,
  RESTORE.REGS
R>,
RTS, END-CODE

PROC.END


  PROC.START

CODE POLY.LEFT.CLIP
>R,
  SAVE.REGS
  0 +POLYPOINTS# A0 PBMove,
  AC () D6 LONG MOVE,
  0 +SHADEPOINTS A1 PBMove,
  -8000000 # D0 LONG MOVE,
  D6 1 LONG SUBQ,
  PL IF,
    BEGIN,
      8 A1 I) D0 LONG CMP, MI IF,         \ find the largest x
        8 A1 I) D0 LONG MOVE,
      THEN,
      3POINT.LENGTH # A1 LONG ADDA,
    D6 LOOP,
    0 +LEFTPLANE A0 PBMove,              \ if larger x is larger than
    A0 () D1 LONG MOVE,
    D1 D0 LONG CMP, GT IF,                \ than left plane then we must draw
      0 +POLYPOINTS# A0 PBMove,
      A0 () D6 LONG MOVE,
```

```
     0 +SHADEPOINTS A1 PBMove,
     80000000 # D0 LONG MOVE,
     D6 1 LONG SUBQ,
     BEGIN,
       8 A1 I) D0 LONG CMP, PL IF,        \ find small x
         8 A1 I) D0 LONG MOVE,
       THEN,
       3POINT.LENGTH # A1 LONG ADDA,
     D6 LOOP,
     0 +LEFTPLANE A0 PBMove,            \ if smaller x is smaller
     A0 () D1 LONG MOVE,
     D1 D0 LONG CMP, LT IF,              \ than hither plane then we must CLIP
       ' CLIP.LEFT.VERT 4- BSR,
     THEN,
   ELSE,
     0 +POLYPOINTS# A0 PBMove,
     0 +SHADEPOINTS A1 PBMove,
     0 # A0 () LONG MOVE,
     0 # A1 () LONG MOVE,
     0 # 4 A1 I) LONG MOVE,
     0 # 8 A1 I) LONG MOVE,
   THEN,
  THEN,
RESTORE.REGS
R>,
RTS, END-CODE

PROC.END


PROC.START

CODE ADD.RIGHT.CLIP.POINT
  >R,
  4           \ Y is second.point
  0           \ Z is first.point
  0 +RIGHTPLANE     \ LEFTPLANE is clip.offset
    8           \ X is scale.point
  ADD.CLIP.POINT
  R>,
  RTS, END-CODE

PROC.END


PROC.START

CODE CLIP.RIGHT.VERT
>R,
  SAVE.REGS
  0 d7 moveq,
  0 D3 MOVEQ,
  0 +SHADEPOINTS A1 PBMove,
  0 +TEMPSHADE A2 PBMove,
  0 +POLYPOINTS# A0 PBMove,
  A0 () D5 LONG MOVE,
  0 +RIGHTPLANE A0 PBMove,
  A0 () D4 LONG MOVE,
  D5 1 LONG SUBQ, PL IF,              \ if more then 1 point...
    3POINT.LENGTH D0 MOVEQ,
    D5 D0 MULS,
    D0 8 LONG A1 @I) D4 LONG CMP, MI IF,      \ test and set last point
      0 D6 MOVEQ,
    ELSE,
```

```
      -1 D6 MOVEQ,
    THEN,
    BEGIN,                          \ start loop to clip poly
      8 A1 I) D4 LONG CMP, MI IF,
        D6 LONG TST, NE IF,
           ' ADD.RIGHT.CLIP.POINT 4- BSR,    \ clip and add the point,
        THEN,
        D5 1 LONG SUBQ,
        0 D6 MOVEQ,                 \ set the in flag and increment count
        3POINT.LENGTH # A1 LONG ADDA,        \ increment the poly point
        -1 D3 MOVEQ,                \ set init flag
      ELSE,
        D6 LONG TST, EQ IF,              \ if in bounds and last was out
          ' ADD.RIGHT.CLIP.POINT 4- BSR,    \ clip and add the point, no increment
        ELSE,
          ADD.POINT,                \ if in bounds and last was in, add point
          D5 1 LONG SUBQ,             \ increment the count
          3POINT.LENGTH # A1 LONG ADDA,      \ increment the poly point
          -1 D3 MOVEQ,              \ set init flag
        THEN,
        -1 D6 MOVEQ,                \ set the out flag
      THEN,
    D5 LONG TST, MI UNTIL,
  THEN,
  SET.POLY.POINTS,
  RESTORE.REGS
R>,
RTS, END-CODE

PROC.END



  PROC.START

CODE POLY.RIGHT.CLIP
>R,
  SAVE.REGS
  0 -POLYPOINTS# A0 PBMove,
  A0 () D6 LONG MOVE,
  0 +SHADEPOINTS A1 PBMove,
  -8000000 # D0 LONG MOVE,
  D6 1 LONG SUBQ,
  PL IF,
    BEGIN,
      8 A1 I) D0 LONG CMP, PL IF,           \ find the smallest x
        8 A1 I) D0 LONG MOVE,
      THEN,
      3POINT.LENGTH # A1 LONG ADDA,
    D6 LOOP,
    0 +RIGHTPLANE A0 PBMove,             \ if small x is smaller than
    A0 () D1 LONG MOVE,
    D1 D0 LONG CMP, LT IF,                 \ than right plane then we must draw
      0 +POLYPOINTS# A0 PBMove,
      A0 () D6 LONG MOVE,
      0 +SHADEPOINTS A1 PBMove,
      8000000 # D0 LONG MOVE,
      D6 1 LONG SUBQ,
      BEGIN,
        8 A1 I) D0 LONG CMP, MI IF,        \ find large x
          8 A1 I) D0 LONG MOVE,
        THEN,
        3POINT.LENGTH # A1 LONG ADDA,
      D6 LOOP,
```

```
      0 +RIGHTPLANE A0 PBMove,           \ if large x is larger
      A0 () D1 LONG MOVE,
      D1 D0 LONG CMP, GT IF,              \ than right plane then we must CLIP
        ' CLIP.RIGHT.VERT 4- BSR,
      THEN,
    ELSE,
      0 +POLYPOINTS# A0 PBMove,
      0 +SHADEPOINTS A1 PBMove,
      0 # A0 () LONG MOVE,
      0 # A1 () LONG MOVE,
      0 # 4 A1 I) LONG MOVE,
      0 # 8 A1 I) LONG MOVE,
    THEN,
  THEN,
RESTORE.REGS
R>,
RTS, END-CODE

PROC.END


PROC.START

CODE ADD.TOP.CLIP.POINT
  >R,
  8           \ X is second.point
  0           \ Z is first.point
  0 +TOPPLANE      \ LEFTPLANE is clip.offset
    4          \ Y is scale.point
  ADD.CLIP.POINT
  R>,
  RTS, END-CODE

PROC.END


  PROC.START

CODE CLIP.TOP.VERT
>R,
  SAVE.REGS
  0 d7 moveq,
  0 D3 MOVEQ,
  0 +SHADEPOINTS A1 PBMove,
  0 +TEMPSHADE A2 PBMove,
  0 +POLYPOINTS# A0 PBMove,
  A0 () D5 LONG MOVE,
  0 +TOPPLANE A0 PBMove,
  A0 () D4 LONG MOVE,
  D5 1 LONG SUBQ, PL IF,                 \ if more then 1 point...
    3POINT.LENGTH D0 MOVEQ,
    D5 D0 MULS,
    D0 4 LONG A1 @I) D4 LONG CMP, PL IF,       \ test and set last point
      0 D6 MOVEQ,
    ELSE,
      -1 D6 MOVEQ,
    THEN,
    BEGIN,                        \ start loop to clip poly
      4 A1 I) D4 LONG CMP, PL IF,
        D6 LONG TST, NE IF,
          ' ADD.TOP.CLIP.POINT 4- BSR,    \ clip and add the point,
        THEN,
        D5 1 LONG SUBQ,
```

```
        0 D6 MOVEQ,                \ set the in flag and increment count
        3POINT.LENGTH # A1 LONG ADDA,       \ increment the poly point
        -1 D3 MOVEQ,               \ set init flag
      ELSE,
        D6 LONG TST, EQ IF,            \ if in bounds and last was out
          ' ADD.TOP.CLIP.POINT 4- BSR,     \ clip and add the point, no increment
        ELSE,
          ADD.POINT,               \ if in bounds and last was in, add point
          D5 1 LONG SUBQ,            \ increment the count
          3POINT.LENGTH # A1 LONG ADDA,     \ increment the poly point
          -1 D3 MOVEQ,             \ set init flag
        THEN,
        -1 D6 MOVEQ,               \ set the out flag
      THEN,
    D5 LONG TST, MI UNTIL,
  THEN,
  SET.POLY.POINTS,
  RESTORE.REGS
R>,
RTS, END-CODE

PROC.END


  PROC.START

CODE POLY.TOP.CLIP
>R,
  SAVE.REGS
  0 +POLYPOINTS# A0 PBMove,
  A0 () D6 LONG MOVE,
  0 +SHADEPOINTS A1 PBMove,
  -8000000 # D0 LONG MOVE,
  D6 1 LONG SUBQ,
  PL IF,
    BEGIN,
      4 A1 I) D0 LONG CMP, MI IF,          \ find the largest y
        4 A1 I) D0 LONG MOVE,
      THEN,
      3POINT.LENGTH # A1 LONG ADDA,
    D6 LOOP,
    0 +TOPPLANE A0 PBMove,            \ if larger x is larger than
    A0 () D1 LONG MOVE,
    D1 D0 LONG CMP, GT IF,             \ than left plane then we must draw
      0 +POLYPOINTS# A0 PBMove,
      A0 () D6 LONG MOVE,
      0 +SHADEPOINTS A1 PBMove,
      8000000 # D0 LONG MOVE,
      D6 1 LONG SUBQ,
      BEGIN,
        4 A1 I) D0 LONG CMP, PL IF,       \ find small y
          4 A1 I) D0 LONG MOVE,
        THEN,
        3POINT.LENGTH # A1 LONG ADDA,
      D6 LOOP,
      0 +TOPPLANE A0 PBMove,           \ if smaller x is smaller
      A0 () D1 LONG MOVE,
      D1 D0 LONG CMP, LT IF,            \ than hither plane then we must clip
        ' CLIP.TOP.VERT 4- BSR,
      THEN,
    ELSE,
      0 +POLYPOINTS# A0 PBMove,
      0 +SHADEPOINTS A1 PBMove,
```

```
      0 # A0 () LONG MOVE,
      0 # A1 () LONG MOVE,
      0 # 4 A1 I) LONG MOVE,
      0 # 8 A1 I) LONG MOVE,
    THEN,
  THEN,
RESTORE.REGS
R>,
RTS, END-CODE

PROC.END


PROC.START

 CODE ADD.BOTTOM.CLIP.POINT
   >R,
   8            \ X is second.point
   0            \ Z is first.point
   0 +BOTTOMPLANE    \ LEFTPLANE is clip.offset
     4            \ Y is scale.point
   ADD.CLIP.POINT
   R>,
   RTS, END-CODE

 PROC.END


   PROC.START

 CODE CLIP.BOTTOM.VERT
 >R,
   SAVE.REGS
   0 d7 moveq,
   0 D3 MOVEQ,
   0 +SHADEPOINTS A1 PBMove,
   0 +TEMPSHADE A2 PBMove,
   0 +POLYPOINTS# A0 PBMove,
   A0 () D5 LONG MOVE,
   0 +BOTTOMPLANE A0 PBMove,
   A0 () D4 LONG MOVE,
   D5 1 LONG SUBQ, PL IF,                 \ if more then 1 point...
     3POINT.LENGTH D0 MOVEQ,
     D5 D0 MULS,
     D0 4 LONG A1 @I) D4 LONG CMP, MI IF,       \ test and set last point
       0 D6 MOVEQ,
     ELSE,
       -1 D6 MOVEQ,
     THEN,
     BEGIN,                        \ start loop to clip poly
       4 A1 I) D4 LONG CMP, MI IF,
         D6 LONG TST, NE IF,
            ' ADD.BOTTOM.CLIP.POINT 4- BSR,  \ clip and add the point,
         THEN,
         D5 1 LONG SUBQ,
         0 D6 MOVEQ,                  \ set the in flag and increment count
         3POINT.LENGTH # A1 LONG ADDA,       \ increment the poly point
         -1 D3 MOVEQ,                 \ set init flag
       ELSE,
         D6 LONG TST, EQ IF,            \ if in bounds and last was out
           ' ADD.BOTTOM.CLIP.POINT 4- BSR,   \ clip and add the point, no increment
         ELSE,
           ADD.POINT,                 \ if in bounds and last was in, add point
           D5 1 LONG SUBQ,              \ increment the count
```

```
        3POINT.LENGTH # A1 LONG ADDA,       \ increment the poly point
        -1 D3 MOVEQ,                   \ set init flag
      THEN,
      -1 D6 MOVEQ,                     \ set the out flag
    THEN,
  D5 LONG TST, MI UNTIL,
 THEN,
 SET.POLY.POINTS,
 RESTORE.REGS
R>,
RTS, END-CODE

PROC.END



 PROC.START

CODE POLY.BOTTOM.CLIP
>R,
 SAVE.REGS
 0 +POLYPOINTS# A0 PBMove,
 A0 () D6 LONG MOVE,
 0 +SHADEPOINTS A1 PBMove,
 -8000000 # D0 LONG MOVE,
 D6 1 LONG SUBQ,
 PL IF,
   BEGIN,
     4 A1 I) D0 LONG CMP, PL IF,           \ find the smallest Y
       4 A1 I) D0 LONG MOVE,
     THEN,
     3POINT.LENGTH # A1 LONG ADDA,
   D6 LOOP,
   0 +BOTTOMPLANE A0 PBMove,              \ if small Y is smaller than
   A0 () D1 LONG MOVE,
   D1 D0 LONG CMP, LT IF,                 \ than bottom plane then we must draw
     0 +POLYPOINTS# A0 PBMove,
     A0 () D6 LONG MOVE,
     0 +SHADEPOINTS A1 PBMove,
     8000000 # D0 LONG MOVE,
     D6 1 LONG SUBQ,
     BEGIN,
       4 A1 I) D0 LONG CMP, MI IF,        \ find large y
         4 A1 I) D0 LONG MOVE,
       THEN,
       3POINT.LENGTH # A1 LONG ADDA,
     D6 LOOP,
     0 +BOTTOMPLANE A0 PBMove,            \ if large y is larger
     A0 () D1 LONG MOVE,
     D1 D0 LONG CMP, GT IF,               \ than bottom plane then we must clip
       ' CLIP.BOTTOM.VERT 4- BSR,
     THEN,
   ELSE,
     0 +POLYPOINTS# A0 PBMove,
     0 +SHADEPOINTS A1 PBMove,
     0 # A0 () LONG MOVE,
     0 # A1 () LONG MOVE,
     0 # 4 A1 I) LONG MOVE,
     0 # 8 A1 I) LONG MOVE,
   THEN,
 THEN,
 RESTORE.REGS
 R>,
 RTS, END-CODE
```

```
PROC.END

PROC.START

CODE (TRANS.POINT)                              \ shunts poly.points
 >R,
  0 +POLYCLIP? A6 I) D0 LONG MOVE,
NE IF,
    D0 HITHERCLIP YONCLIP OR LONG ANDI, NE IF,
      0 +POLYCLIP? A6 I) D0 LONG MOVE,
      D0 HITHERCLIP LONG ANDI, NE IF,
        ' POLY.HITHER.CLIP 4- BSR,
    THEN,
      0 +POLYCLIP? A6 I) D0 LONG MOVE,
      D0 yonclip LONG ANDI, NE IF,
        ' POLY.YON.CLIP 4- BSR,
    THEN,
    ' PROJECT.CLIP.POINTS 4- BSR,
  THEN,
  ' POLY.RIGHT.CLIP   4- BSR,
  ' POLY.LEFT.CLIP   4- BSR,
  ' POLY.TOP.CLIP    4- BSR,
  ' POLY.BOTTOM.CLIP  4- BSR,
 THEN,
 0 +ALIAS? A0 PBMove,
A0 () LONG TST,
EQ IF.L,
  0 +POLYPOINTS# A0 PBMove,
    A0 () D3 LONG MOVE,
     D3 1 LONG SUBQ,
    PL IF.L,
    0 +POLYPOINTS A2 PBMove,
  0 +SHADEPOINTS A0 PBMove,
  0 +ZBUFFSCALE A1 PBMove,
  A1 () D6 LONG MOVE,
    BEGIN,
    9 D1 MOVEQ,
    4 D4 MOVEQ,
    NORMOFF A0 I) D2 LONG MOVE,        \ scale the normal.points
      D2 D0 LONG MOVE,
      D0 D4 LONG ASR,
      D0 D2 LONG SUB,
      D2 D1 LONG ASR,
      D2 LONG NEG,
    D2 NORMOFF A0 I) LONG MOVE,
    NORMOFF 4+ A0 I) D2 LONG MOVE,       \ scale the normal.points
      D2 D0 LONG MOVE,
      D0 D4 LONG ASR,
      D0 D2 LONG SUB,
      D2 D1 LONG ASR,
      D2 LONG NEG,
    D2  NORMOFF 4+ A0 I) LONG MOVE,
    A0 () D0 LONG MOVE,
    4 A0 I) D1 LONG MOVE,
    8 A0 I) D2 LONG MOVE,
    D6 LONG TST, PL IF,
        D0 D6 LONG ASR,
      ELSE,
      D6 D4 LONG MOVE,
      D4 LONG NEG,
      D0 D4 LONG ASL,
    THEN,
```

```
    0 +YALIASOFFSET A1 PBMove,
    A1 () D1 LONG ADD,
    0 +XALIASOFFSET A1 PBMove,
    A1 () D2 LONG ADD,
      FIX>INTEGER,
    0 +YOFFSET A1 PBMove,
    A1 () D1 LONG ADD,
    0 +XOFFSET A1 PBMove,
    A1 () D2 LONG ADD,
    D0 A2 () LONG MOVE,
    D1 4 A2 I) LONG MOVE,
    D2 8 A2 I) LONG MOVE,
    12 # A2 LONG ADDA,
    12 # A0 LONG ADDA,
    D3 LOOP,
    THEN,
ELSE.L,
  0 +POLYPOINTS# A0 PBMove,
    A0 () D3 LONG MOVE,
     D3 1 LONG SUBQ,
    PL IF.L,
    0 +POLYPOINTS A2 PBMove,
  0 +SHADEPOINTS A0 PBMove,
  0 +ZBUFFSCALE A1 PBMove,
  A1 () D6 LONG MOVE,
    BEGIN,
    7 D1 MOVEQ,              \ scale the normal points
    4 D4 MOVEQ,
    NORMOFF A0 I) D2 LONG MOVE,      \ scale the normal.points
      D2 D0 LONG MOVE,
      D0 D4 LONG ASR,
      D0 D2 LONG SUB,
      D2 D1 LONG ASR,
      D2 LONG NEG,
    D2 NORMOFF A0 I) LONG MOVE,
    NORMOFF 4+ A0 I) D2 LONG MOVE,     \ scale the normal.points
      D2 D0 LONG MOVE,
      D0 D4 LONG ASR,
      D0 D2 LONG SUB,
      D2 D1 LONG ASR,
      D2 LONG NEG,
    D2  NORMOFF 4+ A0 I) LONG MOVE,
      A0 () D0 LONG MOVE,
    4 A0 I) D1 LONG MOVE,
    8 A0 I) D2 LONG MOVE,
    D6 LONG TST, PL IF,
        D0 D6 LONG ASR,
      ELSE,
      D6 D4 LONG MOVE,
      D4 LONG NEG,
      D0 D4 LONG ASL,
    THEN,
    0 -YALIASOFFSET A1 PBMove,
    A1 () D1 LONG ADD,
    0 -XALIASOFFSET A1 PBMove,
    A1 () D2 LONG ADD,
      ALIAS.FIX>INTEGER,
    0 +YOFFSET A1 PBMove,
    A1 () D4 LONG MOVE,
    D4 2 # LONG ASL,
    D4 D1 LONG ADD,
    0 +XOFFSET A1 PBMove,
    A1 () D4 LONG MOVE,
    D4 2 # LONG ASL,
```

```
    D4 D2 LONG ADD,
    D0 A2 () LONG MOVE,
    D1 4 A2 I) LONG MOVE,
    D2 8 A2 I) LONG MOVE,
    12 # A2 LONG ADDA,
    12 # A0 LONG ADDA,
    D3 LOOP,
    THEN,
THEN,
R>, RTS,  END-CODE

PROC.END


PROC.START

CODE (JUST.TRANS.CLIP)                          \ shunts poly.points
>R,
  0 -POLYCLIP? A6 I) D0 LONG MOVE,
NE IF,
    D0 HITHERCLIP YONCLIP OR LONG ANDI, NE IF,
      0 +POLYCLIP? A6 I) D0 LONG MOVE,
      D0 HITHERCLIP LONG ANDI, NE IF,
        ' POLY.HITHER.CLIP 4- BSR,
    THEN,
      0 +POLYCLIP? A6 I) D0 LONG MOVE,
      D0 yonclip LONG ANDI, NE IF,
        ' POLY.YON.CLIP 4- BSR,
    THEN,
    ' PROJECT.CLIP.POINTS 4- BSR,
  THEN,
  ' POLY.RIGHT.CLIP   4- BSR,
  ' POLY.LEFT.CLIP  4- BSR,
  ' POLY.TOP.CLIP    4- BSR,
  ' POLY.BOTTOM.CLIP  4- BSR,
  THEN,
  0 +POLYPOINTS# A0 PBMove,
  A0 () D3 LONG MOVE,
  D3 1 LONG SUBQ,
  PL IF,
    0 +POLYPOINTS A2 PBMove,
  0 +SHADEPOINTS A0 PBMove,
  0 +ZBUFFSCALE A1 PBMove,
  A1 () D6 LONG MOVE,
    BEGIN,
      A0 () D0 LONG MOVE,
    4 A0 I) D1 LONG MOVE,
    8 A0 I) D2 LONG MOVE,
    D6 LONG TST, PL IF,
        D0 D6 LONG ASR,
      ELSE,
      D4 LONG NEG,
      D0 D6 LONG ASL,
    THEN,
    D0 A2 () LONG MOVE,
    D1 4 A2 I) LONG MOVE,
    D2 8 A2 I) LONG MOVE,
    12 # A2 LONG ADDA,
    12 # A0 LONG ADDA,
    D3 LOOP,
   THEN,
   R>, RTS, END-CODE

 PROC.END
```

```
PROC.START

CODE (MAXY.SORT)                    \ finds maximum y scanline
>R,
0 +POLYPOINTS A0 PBMove,            \ A0 is Poly.Points
0 +POLYPOINTS# A6 I) D2 LONG MOVE,       \ d2 is number of points
4 A0 I) D0 LONG MOVE,               \ set first point
12 # A0 LONG ADDA,
D2 2 LONG SUBQ, PL IF,              \ if non zero ...
  BEGIN,
    4 A0 I) D0 LONG CMP, MI IF,
      4 A0 I) D0 LONG MOVE,
    THEN,
  12 # A0 LONG ADDA,
  D2 LOOP,
THEN,
0 +ALIAS? A0 PBMove,                \ if aliasing is turned on then
A0 () LONG TST, NE IF,              \ scale down by 2
  D0 2 # LONG ASR,
THEN,
 0 +TPOLYYMAX  A0 PBMove,             \ clip and store
   A0 () D0 LONG CMP, PL IF,
  A0 () D0 LONG MOVE,               \ check y max bounds
 THEN,
 TPOLY.YMIN TPOLY.YMAX - A0 I) D0 LONG CMP,
 MI IF,
  TPOLY.YMIN TPOLY.YMAX - A0 I)         \ check y min bounds
  D0 LONG MOVE,
 THEN,
  0 +YMAXSCAN  A0 PBMove,
 D0 A0 () LONG MOVE,                \ store result
 R>,
 RTS,  END-CODE

 PROC.END


 PROC.START

 CODE (MINY.SORT)                    \ finds maximum y scanline
 >R,
 0 +POLYPOINTS A0 PBMove,            \ A0 is Poly.Points
 0 +POLYPOINTS# A6 I) D2 LONG MOVE,       \ d2 is number of points
 4 A0 I) D0 LONG MOVE,               \ set first point
 12 # A0 LONG ADDA,
 D2 2 LONG SUBQ, PL IF,              \ if non zero ...
   BEGIN,
     4 A0 I) D0 LONG CMP, PL IF,
       4 A0 I) D0 LONG MOVE,
     THEN,
   12 # A0 LONG ADDA,
   D2 LOOP,
  THEN,
  0 +ALIAS? A0 PBMove,                \ if aliasing is turned on then
  A0 () LONG TST, NE IF,              \ scale down by 2
    D0 2 # LONG ASR,
  THEN,
   0 +TPOLYYMAX  A0 PBMove,             \ clip and store
     A0 () D0 LONG CMP, PL IF,
    A0 () D0 LONG MOVE,               \ check y max bounds
```

```
THEN,
TPOLY.YMIN TPOLY.YMAX - A0 I) D0 LONG CMP,
MI IF,
 TPOLY.YMIN TPOLY.YMAX - A0 I)          \ check y min bounds
 D0 LONG MOVE,
THEN,
 0 +YBASESCAN  A0 PBMove,
D0 A0 () LONG MOVE,                 \ store result
R>,
RTS,  END-CODE

PROC.END


PROC.START

CODE (MAXX.SORT)                    \ finds maximum y scanline
>R,
0 +POLYPOINTS A0 PBMove,            \ A0 is Poly.Points
0 +POLYPOINTS# A6 I) D2 LONG MOVE,        \ d2 is number of points
8 A0 I) D0 LONG MOVE,               \ set first point
12 # A0 LONG ADDA,
D2 2 LONG SUBQ, PL IF,              \ if non zero ...
  BEGIN,
    8 A0 I) D0 LONG CMP, MI IF,
      8 A0 I) D0 LONG MOVE,
    THEN,
  12 # A0 LONG ADDA,
  D2 LOOP,
THEN,
0 +ALIAS? A0 PBMove,               \ if aliasing is turned on then
A0 () LONG TST, NE IF,              \ scale down by 2
  D0 2 # LONG ASR,
THEN,
 0 +POLYXMAX  A0 PBMove,            \ clip and store
  A0 () D0 LONG CMP, PL IF,
  A0 () D0 LONG MOVE,              \ check y max bounds
 THEN,
 POLY.XMIN POLY.XMAX - A0 I) D0 LONG CMP,
 MI IF,
  TPOLY.XMIN TPOLY.XMAX - A0 I)         \ check y min bounds
  D0 LONG MOVE,
 THEN,
  0 +XMAXSCAN  A0 PBMove,
D0 A0 () LONG MOVE,                \ store result
R>,
RTS, END-CODE

PROC.END


PROC.START

CODE (MINX.SORT)                  \ finds maximum y scanline
>R,
0 +POLYPOINTS A0 PBMove,           \ A0 is Poly.Points
0 +POLYPOINTS# A6 I) D2 LONG MOVE,       \ d2 is number of points
8 A0 I) D0 LONG MOVE,              \ set first point
12 # A0 LONG ADDA,
D2 2 LONG SUBQ, PL IF,             \ if non zero ...
  BEGIN,
    8 A0 I) D0 LONG CMP, PL IF,
      8 A0 I) D0 LONG MOVE,
```

```
    THEN,
  12 # A0 LONG ADDA,
  D2 LOOP,
THEN,
0 +ALIAS? A0 PBMove,              \ if aliasing is turned on then
A0 () LONG TST, NE IF,              \ scale down by 2
  D0 2 # LONG ASR,
THEN,
 0 +POLYXMAX  A0 PBMove,           \ clip and store
   A0 () D0 LONG CMP, PL IF,
  A0 () D0 LONG MOVE,             \ check y max bounds
 THEN,
 POLY.XMIN POLY.XMAX - A0 I) D0 LONG CMP,
 MI IF,
  TPOLY.XMIN TPOLY.XMAX - A0 I)        \ check y min bounds
  D0 LONG MOVE,
 THEN,
  0 -XBASESCAN  A0 PBMove,
D0 A0 () LONG MOVE,               \ store result
R>,
RTS, END-CODE

PROC.END



PROC.START

  PROC.START

CODE (POLY.BOUNDS)
>R,
' (MAXY.SORT)  4 - BSR,
' (MINY.SORT)  4- BSR,
0 +YMAXSCAN A6 I) D0 LONG MOVE,
  0 +YBASESCAN A6 I) D0 LONG CMP, EQ IF,
  0 # 0 +POLYPOINTS# A6 I) LONG MOVE,
ELSE,
  ' (MAXX.SORT) 4- BSR,
  ' (MINX.SORT) 4- BSR,
  0 +XMAXSCAN A6 I) D0 LONG MOVE,
    0 +XBASESCAN A6 I) D0 LONG CMP, EQ IF,
    0 # 0 +POLYPOINTS# A6 I) LONG MOVE,
  THEN,
 THEN,
 R>, RTS, END-CODE

 PROC.END
```

```
2 BASE !
11111000 CONSTANT SWITCH.MASK
DECIMAL
0 CONSTANT START.JUMP.TAB

 : RESTORE.POLY.REGS  ASSEMBLER         \ restores regs from poly calls
  R>,
  RP )+ REGLIST D3-D7/A2/A4/A6 LONG MOVEM,
  RP () RP LONG MOVE,  ;


 : SAVE.POLY.REGS    ASSEMBLER
  RP PUSH,
  A0 RP LONG MOVE,
  0 +PolyReturnStack # RP LONG ADDA,       \ set new return stack
  SP )+ RP -) long move,             \ save old r stack on new
  A0 PUSH,
  REGLIST D3-D7/A2/A4/A6 RP -)  LONG MOVEM,
  A6 POP,
  >R, ;

 : SET.JUMP.TOKEN
  0 LOCALS| THE.ADD2 THE.ADD1 THE.INDEX
  THE.INDEX 8 * 2+ START.JUMP.TAB + TO THE.ADD2
  THE.ADD1 THE.ADD2 6 + - THE.ADD2 W! ;


 PROC.START
 CODE PolySegment
   d1 pop,
   a0 pop,
   0 +PolySelect a0 I) d0 long move,
   d0 switch.mask long andi,
   d1 push,
   d0 2 word pc@I) Jmp,
   HERE ' START.JUMP.TAB !
    0 # D0 WORD MOVE,
    D0 2 word pc@I) Jmp,
    0 # D0 WORD MOVE,
    D0 2 word pc@I) Jmp,
    0 # D0 WORD MOVE,
    D0 2 word pc@I) Jmp,
    0 # D0 WORD MOVE,
    D0 2 word pc@I) Jmp,
    0 # D0 WORD MOVE,
    D0 2 word pc@I) Jmp,
    0 # D0 WORD MOVE,
    D0 2 word pc@I) Jmp,
    0 # D0 WORD MOVE,
    D0 2 word pc@I) Jmp,
    0 # D0 WORD MOVE,
    D0 2 word pc@I) Jmp,
    0 # D0 WORD MOVE,
    D0 2 word pc@I) Jmp,
    0 # D0 WORD MOVE,
    D0 2 word pc@I) Jmp,
    0 # D0 WORD MOVE,
    D0 2 word pc@I) Jmp,
    0 # D0 WORD MOVE,
    D0 2 word pc@I) Jmp,
    0 # D0 WORD MOVE,
    D0 2 word pc@I) Jmp,
    0 # D0 WORD MOVE,
    D0 2 word pc@I) Jmp,
```

```
    0 # DO WORD MOVE,
    DO 2 word pc@I) Jmp,
    0 # DO WORD MOVE,
    DO 2 word pc@I) Jmp,
    0 # DO WORD MOVE,
    DO 2 word pc@I) Jmp,
    0 # DO WORD MOVE,
    DO 2 word pc@I) Jmp,
    0 # DO WORD MOVE,
    DO 2 word pc@I) Jmp,
    0 # DO WORD MOVE,
    DO 2 word pc@I) Jmp,
    0 # DO WORD MOVE,
    DO 2 word pc@I) Jmp,
    0 # DO WORD MOVE,
    DO 2 word pc@I) Jmp,
    0 # DO WORD MOVE,
    DO 2 word pc@I) Jmp,
    0 # DO WORD MOVE,
    DO 2 word pc@I) Jmp,
    0 # DO WORD MOVE,
    DO 2 word pc@I) Jmp,
    0 # DO WORD MOVE,
    DO 2 word pc@I) Jmp,
    0 # DO WORD MOVE,
    DO 2 word pc@I) Jmp,
    0 # DO WORD MOVE,
    DO 2 word pc@I) Jmp,
    0 # DO WORD MOVE,
    DO 2 word pc@I) Jmp,
    0 # DO WORD MOVE,
    DO 2 word pc@I) Jmp,
    0 # DO WORD MOVE,
    DO 2 word pc@I) Jmp,
    0 # DO WORD MOVE,
    DO 2 word pc@I) Jmp,
    RTS,
end-code
PROC.END
```

```
/* the communication block to talk to Swivel Render Libs */
/* the resource to the rendering code is loaded, locked, and its */
/*  handle placed in the PolyProc Field */


#define PTARRAYLEN  (100 * 12)
#define SCANRECNUM 1024
#define TRANSPOINT 8 8 *
#define JUSTTRANSCLIP 8 9 *
#define TWOVECTOR 8 10 *
#define CROSSPRODUCT 8 11 *
#define GETCOLORINDEX 8 12 *
#define FULLSHADE 8 13 *
#define NORMALIZE 8 14 *
#define WIREFRAME 8 0 *
#define HIDDENWIRE 8 1 *
#define SHADEWIRE 8 2 *
#define SHADED 8 3 *
#define PHONG 8 4 *
#define INITBACKPORT 8 16 *
#define INITZBUFFER 8 17 *
#define INITSCANARRAY 8 18 *


typedef struct {
  long: PolyProc;
  long: PolySelect;
  short: PolyError;
  long: scan.array;
  long: (scan.array);
  long: zbuffer;
  long: ^zbuffer;
  long: zbufferx;
  long: zbuffery;
  long: obuffer;
  long: ^polybits;
  long: PolyBits;
  long: PolyRow;
  long: polydepth;
  long: CurrentBackport;
    long: BackGDevice;
  long: ObjectId;
  long: PatIndex;
  long: Pat;
  long: LinePat;
  long: Shade;
  long: Brightness;
  long: Brightness2;
  long: ReflectOff;
  long: TempRange;
  long: LightVector[3];
  long: ColorIndex;
  long: KeyColorRes;
  long: AliasMask[2];
  long: AliasFlag;
  long: YOffset;
  long: XOffset;
  long: YaliasOffset;
  long: XaliasOffset;
  long: Orthographic;
  long: cdistance;
    long: cdistint;
```

```
long: cubebounds[6];
long: HitherPlane;
long: YonPlane;
long: LeftPlane;
long: RightPlane;
long: TopPlane;
long: BottomPlane;
long: polyclipflag;
long: CullBackflag;
long: zbuffscale;
long: ZYDiff;
long: ZXDiff;
long: TheBuffer;
long: TPolyYMin;       /* redrawing bounds */
long: TPolyXMin;       /* less than backport bounds */
long: TPolyYMax;
long: TPolyXMax;
long: PolyYMin;
long: PolyXMin;
long: PolyYMax;
long: PolyXMax;
long: ymaxscan;
long: ybasescan;
long: xmaxscan;
long: xbasescan;
long: ymapdiff;
long: xmapdiff;
long: xnormbase;
long: xnorminc;
long: ynormbase;
long: ynorminc;
long: mapbuff;
  long: TempPointA[12];
long: TempPointB[12];
long: PolyPointsCount;

long: PolyPoints[PTARRAYLEN];
long: ShadePoints[PTARRAYLEN];
long: TempShade[PTARRAYLEN];
long: NormalPoints[PTARRAYLEN];
long: TempNormalPoints[PTARRAYLEN];
long: ScanIndex[SCANRECNUM];

longs: ReturnStackTop[256];
Bytes: PolyReturnStack;
} PolyRenderBlock;
```

```
\ PORT INITIALIZATION STUFF
\ Last Revision: 09/05/87  10:50:54 AM   YH


CR ." Loading Port Inits... "
ANEW PORT.INITS


  hex
    A870 constant _LocalToGlobal
  A873 MT SET.PORT
  decimal


  code LocalToGlobal
     SP d0 long move,
     DO PUSH,
     _LocalToGlobal W,
    NEXT END-CODE



: INIT.SCREEN
  SCREEN.BOUNDS     W@ ' TOP.BOUNDS !
  SCREEN.BOUNDS 2 + W@ ' LEFT.BOUNDS !
  SCREEN.BOUNDS 4 + W@ ' BOTTOM.BOUNDS !
  SCREEN.BOUNDS 6 + W@ ' RIGHT.BOUNDS !
  0  V.TOOL.WIDTH ZBUFFERY @ ZBUFFERX @ V.TOOL.WIDTH -
  WORK.SPACE.RECT !RECT  ;



:  SET.WINDOW.LIMITS
  GET.WINDOW
  0 LOCALS| S.X C.WINDOW |
  ThisSystem seHasColorQD C@ IF
      Getgdevice @ +gdpmap @ @ BASEADDR @ OUTPUT.BITS !
      Getgdevice @ +gdpmap @ @ ROWBYTES W@ ROW.BIT - OUTPUT.ROW !
      Getgdevice @ +gdpmap @ @ PIXELSIZE W@ OUTPUT.DEPTH !
    ELSE
      C.WINDOW 2+ @  OUTPUT.BITS !
      C.WINDOW 6+ W@ OUTPUT.ROW !
      1 OUTPUT.DEPTH !
    THEN
    C.WINDOW   PLEFTBOUNDS W@
    C.WINDOW   PUPBOUNDS W@
    XY>POINT LOCALTOGLOBAL POINT>XY
    2DUP STARTY ! DUP TO S.X V.TOOL.WIDTH + STARTX !
    2DUP YOFFSET @ + SHUNTY !
       XOFFSET @ + SHUNTX !
         TOP.BOUNDS      MAX
       BOTTOM.BOUNDS  MIN
       WINYMIN !
       V.TOOL.WIDTH +
       LEFT.BOUNDS     MAX
       RIGHT.BOUNDS    MIN
       WINXMIN !
     C.WINDOW   PDOWNBOUNDS W@
       SCROLL.WIDTH -             \ subtract the scroll bars
       ZBUFFERY @ 1- MIN            \ clip to zbuffer y limit
       STARTY @ +               \ add starting y offset
         TOP.BOUNDS MAX             \ clip to top of screen bounds
       BOTTOM.BOUNDS  MIN           \ clip to bottom of screen bounds
       WINYMAX !
```

```
C.WINDOW   PRIGHTBOUNDS W@
  SCROLL.WIDTH -            \ subtract width of scroll bars
  ZBUFFERX @
  V.TOOL.WIDTH + 1- MIN         \ clip to zbuffer x limit
  S.X +                   \ add starting x offset
  LEFT.BOUNDS MAX           \ clip to left screen bounds
  RIGHT.BOUNDS  MIN           \ clip to right screen bounds
  WINXMAX !
 ^LINER.BIT  LINE.TOKEN !
 OUTPUT.DEPTH @
 CASE                  \ adjust line drawing for depth
   1 OF ^LINER.1BIT LINE.TOKEN ! ENDOF
   2 OF ^LINER.2BIT LINE.TOKEN ! ENDOF
   4 OF ^LINER.4BIT LINE.TOKEN ! ENDOF
   8 OF ^LINER.8BIT LINE.TOKEN ! ENDOF
 ENDCASE ;

: SET.VIEW.LIMITS
  SET.WORK.SPACE.RECT
  SET.WINDOW.LIMITS ;
```

```
\ QD Traps used in swivel

cr ." Loading QD Traps... "


HEX

  AA00  MT        OpenCport    \ CGrafPtr -- opens new port and sets as current
  AA01  MT       InitCport    \ CGrafPtr -- sets defaults for port , uses MaxGDevice
  A87D  MT       CloseCPort    \ CGrafPtr -- closes the port
  AA03  FUNC>L     NewPixMap    \ -- PixMapHandle creates new PixMap from GDevice
                    \ allocates but does not init color tables, data and exp. data
  AA04  MT       DisposPixMap  \ PixMapHandle -- disposes pixMap and color table
                    \ be careful to not dispose of the GDevice's color table
  AA06  MT       SetCPortPix   \ PixMapHandle -- sets the PixMap of the current port
  AA18  W>FUNC>L  GetCTable
  AA40  FUNC>W    QDError


DECIMAL



HEX
  AA33  L>FUNC>L  Color2Index \ TheRGBColor -- TheIndex

  AA34 MT   Index2Color      \ TheIndex\TheColorAddr --

  AA14 MT   RGBForeColor       ( RGBaddress -- )
                 \ Selects the RGB color to be used for Pen
                 \ drawing and shape filling
  AA15 MT   RGBBackColor       ( RGBaddress -- )
                 \ Selects the RGB color to be used for
                 \ shape and rectangle erasing
  AA19 MT   GetRGBForeColor      ( RGBaddress -- )
                 \ Returns the RGB color to be used for
                 \ shape and rectangle erasing
  AA1A MT GetRGBBackColor      ( RGBaddress -- )
                 \ Returns the RGB color to be used for
                 \ shape and rectangle erasing
    AA0E MT        FillCRect   ( RectAddr\PixPatHandle --  )
  AA13 MT       FillCPoly   ( PolyHandle\PixPatHandle --  )
  AA0C w>Func>l GetPixPat      ( Partid -- PixPatHandle )
                 \ Creates handle to current PixPat
  AA07 Func>l NewPixPat      ( -- PixPatHandle )
                 \ Creates a new initialized PixPatHandle
    AA08 MT        DisposPixPat  ( PixMPatHandle -- )
                 \ Disposes of a PixPat
    AA09 MT        CopyPixPat    ( PixPatphandle1\PixPatHandle2 -- )
                 \ Copies PixPat1 to PixPat2 including colormap
    AA0D MT        MakeRGBPat    ( PixPatHandle\ColorSpecAddr --  )
                 \ Combines existing colors into a pattern
                 \ which approximates the requested RGB
                 \ color specification.
    AA0A MT        PenPixPat   ( PixPatHandle --  )
                 \ Sets Pen Pattern for the current CGrafport
    AA0B MT        BackPixPat    ( PixPatHandle --  )
                 \ Sets Fill Pattern for the current CGrafport

  A8CB FUNC>L POLY.IS:         ( --  poly  to open new polygon )
  A8CC MT     POLY.END         ( ---   closes current polygon   )
   A8CD MT     DISPOSE.POLY    ( poly --   disposes polygon      )
```

```
 A8F3 L>FUNC>L PICTURE.IS:      ( rect -- pict   returns handle )
 AA20 L>FUNC>L C.PICTURE.IS:    ( rect -- pict   returns handle )
 A8F4  MT      PICTURE.END      ( ---   stops recording pict    )
 A8F5  MT      DISPOSE.PICTURE  ( pict --   returns handle      )

DECIMAL


hex

  <code  NewGdevice  ( RefNum\mode -- GDHandle )
         \  Opens and initializes a Graphics device RefNum in the
         \  specified mode.
            Popd0, popa0, push0, pushwa0, pushd0, AA2F w, Next,


  <code  InitGdevice ( RefNum\mode\GDHandle  -- )
         \  Sets driver RefNum to the specified mode
            popa0, popd0, dropw, pushd0, pusha0,  AA2E w, Next,


  AA32 FUNC>L   GetGDevice    ( -- GDHandle  )     \ returns handle to current
  AA24 MT   DisposCTable                  \ Graphics device
  AA31 MT       SetGDevice     ( GDHAndle -- )       \ sets current Gdevice
  AA30 MT     DisposGDevice ( GDHandle -- )     \ Disposes Current Gdevice
                            \ releasing memory

  AA2A FUNC>L GetCTSeed     ( -- seed for current color table)


decimal


 CREATE  PICT.IN.PROGRESS  0 ,


: OPEN.PICTURE            \ start recording picture
  PICT.IN.PROGRESS @ NOT IF     \ check for picture in progess
    -1 PICT.IN.PROGRESS !     \ set flag
     PICTURE.IS:        \ start the definition
  THEN ;


: CLOSE.PICTURE            \ end picture recording
  PICT.IN.PROGRESS @ IF       \ close only if open
    0 PICT.IN.PROGRESS !
     PICTURE.END
  THEN ;


(  COPY.BITS  )                               ( 110786 YH )


  HEX

    A8EC  MT <COPY.BITS>
    A875  MT  NSET.PBITS
    A87D  MT  CLOSE.PORT

  DECIMAL
```

```
( COPY.BITS   srcbitmap/dstbitmap/srcrect/dstrect/copymode )
(  /maskrgn -- ( copy bits between bitmaps      )

 : COPY.BITS
   SWAP 2 WBURY <COPY.BITS>  ;

   AXE <COPY.BITS>

STRUCTURE PIXMAP
  LONG:   BASEADDR
  SHORT:  ROWBYTES
  SHORT:  UPBOUNDS
  SHORT:  LEFTBOUNDS
  SHORT:  DOWNBOUNDS
  SHORT:  RIGHTBOUNDS
  SHORT:  PMVersion
  SHORT:  PackType
  LONG: PackSize
  LONG: hres
  LONG: vres
  SHORT:  PixelType
  SHORT:  PixelSize
  SHORT:  cmpcount
  SHORT:  cmpsize
  LONG: PlaneBytes
  LONG: CTabHandle
  LONG: Reserved
  STRUCTURE.END

STRUCTURE CGraphPort
  Short:  Device
  Long:   PortPix
  Short:  PortVersion
  Long:   GraphVars
  SHORT:  CHEXTRA
  SHORT:  PNLOCHFRAC
  SHORT:  PUPBOUNDS
  SHORT:  PLEFTBOUNDS
  SHORT:  PDOWNBOUNDS
  SHORT:  PRIGHTBOUNDS

  STRUCTURE.END

\ color palette structures

   Structure RGBColor
     Short:  +red    \ magnitude of red component
     Short:  +green    \ magnitude of green component
     Short:  +blue   \ magnitude of blue component
     structure.end

     Structure ColorTable
            Long:  +ctSeed      \ unique identifier for table
            Short: +transIndex    \ index of transparent pixel
            Short: +ctSize      \ number of entries - 1 in CTTable
   ColorTable 0 Structs: +ctTable     \ Array of ColorSpecs ctSize long
     structure.end
```

```
Structure ColorSpec
     Short:   +csvalue    \  index or other value
RGBColor Struct:  +csRGBColor \  true color
  structure.end


Structure GDevice
        Short:   +gdRefNum   \ driver's unit number
        Short:   +gdID     \ client ID for search procs
        Short:   +gdType     \ fixed/CLUT/direct
         Long:   +gdITable   \ handle to inverse lookup table
        Short:   +gdResPref    \ preferred resolution of GDITable
         Long:   +gdSearchProc \ Handle first element in search list
         Long:   +gdCompProc   \ Handle first element in complement list
        Short:   +gdFlags    \ grafDevice flags word
         Long:   +gdPMap     \ handle to pixMap describing device
         Long:   +gdRefCon   \ reference value
         Long:   +gdNextGD   \ handle of next gDevice
       4 Shorts:   +gdRect     \ device's bounds in global coordinates
         Long:   +gdMode     \ device's current mode
        Short:   +gdCCBytes    \ depth of expanded cursor data
        Short:   +gdCCDepth    \ depth of expanded cursor data
         Long:   +gdCCXData    \ handle to cursor's expanded data
         Long:   +gdCCXMask    \ handle to cursor's expanded mask
         Long:   +gdReserved   \ future use, must be 0
    structure.end


2 base !
  1100010000000001  constant gdFlagsSet   \ flags for offscreen gdevice
decimal

hex
  8000 constant RowMask         \ to mask rowbytes on a color pixmap
decimal

\ abbreviated structures from PixMap

: +pmtable 42 + ;
```

```
\ RESOURCE UTILITIES
\ copyright 1987 by Young Harvill
\ all rights reserved
\ Defines words to set up arrays of resources as records
\ resulting records are accessed with pluck, place
\ set.current.records and set.current.record
\ Last Revision: 12/29/87  11:09:11 AM   YH

CR ." Loading Resource Utils ... "

ANEW RESOURCE.UTILS


HEX

CODE GetlResource
  D0 POP,
  D1 POP,
  0 D2 MOVEQ,
  D2 PUSH,
  D1 PUSH,
  D0 WPUSH,
  A81F W,
  NEXT END-CODE
DECIMAL


: NEW.RESOURCE                  \ type, id , length ,  --- handle
  0 LOCALS| N.HANDLE R.LENGTH R.ID  R.TYPE  |
  0 ?HEAP.SIZE MINHEAPSIZE > IF
  R.LENGTH NEW.CLEAR.HANDLE           \ allocate handle with bytes set to zero
  0= IF
    DUP TO N.HANDLE              \ save in local
    R.TYPE                   \ handle , type
    R.ID                    \ handle type id
    NIL.NAME                 \ handle type id name
    ADD.RESOURCE
    N.HANDLE                  \ place handle on stack
  ELSE DROP 0 THEN
  ELSE 0 THEN  ;                  \ else output zero


HEX
  A9B0 MT WRITE.RESOURCE
DECIMAL


CREATE RES.TYPE 0 ,              \ variable for fetching res info
CREATE RES.ID   0 ,
VARIABLE RES.NAME 256 ALLOT
RES.NAME 256 BLANKS

: GET.RES.ID                  \ res.handle -- res.id
  LOCALS| R.HANDLE |
  R.HANDLE RES.ID
    RES.TYPE
    RES.NAME
    GET.RES.INFO
  RES.ID W@ ;


: GET.RES.NAME                  \ res.handle -- res.id
```

```
 LOCALS| R.HANDLE |
 R.HANDLE RES.ID
   RES.TYPE
   RES.NAME
   GET.RES.INFO
 RES.NAME  ;

: GET.RES.TYPE              \ res.handle -- res.type
 LOCALS| R.HANDLE |
 R.HANDLE               \ fetch resource info
   RES.ID
   RES.TYPE
   RES.NAME
   GET.RES.INFO
 RES.TYPE @  ;


: COPY.RESOURCE              \ ResHandle ResID-- New ResHandle
 0 LOCALS| N.HANDLE R.ID  R.HANDLE
 0 ?HEAP.SIZE MINHEAPSIZE > IF
 R.HANDLE LOCK.HANDLE
 HAND.TO.HAND 0=  IF          \ copy resource data
   TO N.HANDLE
   R.HANDLE RES.TYPE          \ fetch resource info
   RES.ID   RES.NAME
   GET.RES.INFO
   R.HANDLE RES.TYPE @
   R.ID     NIL.NAME
   ADD.RESOURCE
   N.HANDLE
 ELSE DROP 0
   R.HANDLE UNLOCK.HANDLE       \ unlock handle
 THEN
 ELSE 0 THEN  ;               \ return handle or zero


\  Resource Record Utilities
\  Res Record Globals


 CREATE NIL.RECORD  0 , -128 ,
 CREATE  CURRENT.COUNT 0 ,
 CREATE  CURRENT.RECORDS  0 ,
 8 CONSTANT C.REC.LENGTH


 : NEW.RESOURCE.RECORDS        \ res.id start.id end.id ---- name
  LOCALS| E.RANGE S.RANGE R.ID |
  0 CURRENT.COUNT !
  CREATE
 HERE CURRENT.RECORDS !       \ set current record
        0 ,             \ current.id
      0 ,             \ current.handle
      0 ,             \ current.ptr
      0 ,             \ minimum.count
      0 ,             \ address of default record
  R.ID      ,            \ record.type
  S.RANGE   ,            \ start of range
  E.RANGE   ,            \ end of range
  HERE
  E.RANGE S.RANGE -          \ number of records
  C.REC.LENGTH *            \ length of tab entry
```

```
DUP ALLOT            \ allot tab
ERASE               \ erase tab
DOES>  ;             \ just return address for now


\ offsets for records

 0  CONSTANT  C.ID
 4  CONSTANT  C.HANDLE
 8  CONSTANT  C.POINTER
12  CONSTANT  C.COUNT
16  CONSTANT  C.DEFAULT
20  CONSTANT  C.TYPE
24  CONSTANT  C.START
28  CONSTANT    C.END
32  CONSTANT    C.TAB


: CLONE.RECORDS                  \ res.record -- sets field the same
  C.COUNT + @                   \ count of orginal
  CURRENT.COUNT ! ;              \ set count global


: END.RES.RECORDS                \ resolves res.records
  CURRENT.COUNT @                \ fetch count of records
  CURRENT.RECORDS @              \ current resource records
  C.COUNT + ! ;                 \ store count in record


 :  TAB.OF, ASSEMBLER               \  record id -- address of tab
    DO POP,
    AO POP,
  C.END AO I) DO LONG CMP, LT IF,      \ check high bounds
    C.START AO I) DO LONG SUB,
      DO LONG TST, PL IF,          \ check low bounds
      DO 3 # LONG ASL,        \ index for c.tab
         DO C.TAB WORD AO @I) PEA,     \ push address
      ELSE,
      NIL.RECORD AO )#MOVE,        \ else push address of nil
      AO PUSH,
      THEN,
  ELSE,
    NIL.RECORD AO )#MOVE,          \ else push address of nil
    AO PUSH,
  THEN, ;

CODE TAB.OF  TAB.OF,  NEXT END-CODE


 : LOAD.RECORDS
  CURRENT.RECORDS @                      \ use global current records
  DUP C.TYPE + @                    \ for local type and record
    0 0 LOCALS|  R.ERROR RES.HANDLE T.TYPE C.RECORDS
  0 ?HEAP.SIZE MINHEAPSIZE > IF
    C.RECORDS C.END + @                \ find end
    C.RECORDS C.START + @                \ and start of res.id's and loop
    DO
       T.TYPE I GET1RESOURCE              \ load resource
      TO RES.HANDLE                 \ store handle in local var
      RES.ERROR TO R.ERROR             \ store error in local var
      R.ERROR IF                  \ if error exists...
        R.ERROR TO ERROR.FLAG           \ set error global
        0 TO RES.HANDLE              \ set handle to nil
      THEN
```

```
    RES.HANDLE C.RECORDS I TAB.OF !          \ store in c.handle
    RES.HANDLE IF                      \ if handle is not nil
      1 C.RECORDS I TAB.OF 4+ !         \ set active if resource exists
    ELSE
      0 C.RECORDS I TAB.OF 4+ !         \ set unused if no resource exists
    THEN
  LOOP
ELSE -108 TO ERROR.FLAG THEN ;

: LOCK.RECORDS                 \ locks active resources in record
 CURRENT.RECORDS @               \ fetch current res.records
 DUP C.TYPE + @                \ get the type
 LOCALS| T.TYPE C.RECORDS |          \ define globals
 C.RECORDS C.END + @            \ end of res.id range
 C.RECORDS C.START + @            \ beginning of res.id range
 DO
     C.RECORDS I TAB.OF @           \ fetch tab for current res
     DUP IF LOCK.HANDLE             \ if active lock handle
   ELSE DROP THEN              \ else drop handle
 LOOP ;

: UNLOCK.RECORDS                 \ locks handles for current records
 CURRENT.RECORDS @                \ fetch current from globals
 DUP C.TYPE + @                \ fetch type from current
 LOCALS| T.TYPE C.RECORDS            \ define locals
 C.RECORDS C.END + @               \ high end of res.id range
 C.RECORDS C.START + @              \ low end of res.id range
 DO              \ start loop
   C.RECORDS I TAB.OF  @         \ fetch tab of current record
   DUP IF               \ if active
     UNLOCK.HANDLE               \ unlock handle of resource
   ELSE DROP THEN              \ else drop handle
 LOOP ;

 : DETACH.RECORDS                 \ detaches resources for current
 CURRENT.RECORDS @                \ fetch current from globals
 DUP C.TYPE + @                \ fetch type from current
 LOCALS| T.TYPE C.RECORDS |          \ define locals
 C.RECORDS C.END + @               \ high end of res.id range
 C.RECORDS C.START + @              \ low end of res.id range
 DO              \ start loop
   C.RECORDS I TAB.OF  @         \ fetch tab of current record
   DUP IF               \ if active
     DETACH.RESOURCE             \ detach resource
   ELSE DROP THEN              \ else drop handle
 LOOP ;

: ATTACH.RECORDS
 CURRENT.RECORDS @                \ fetch current from globals
 DUP C.TYPE + @                \ fetch type from current
 LOCALS| T.TYPE C.RECORDS            \ define locals
 C.RECORDS C.END + @               \ high end of res.id range
 C.RECORDS C.START + @              \ low end of res.id range
 DO              \ start loop
   C.RECORDS I TAB.OF  @         \ fetch tab of current record
   ?dup IF               \ if active
       T.TYPE              \ handle , type
     I                  \ handle type id
     NIL.NAME            \ handle type id name
```

```
    ADD.RESOURCE
    RES.ERROR ?dup IF
      TO ERROR.FLAG
    THEN
  THEN                  \ else drop handle
LOOP ;


: RELEASE.RECORDS
CURRENT.RECORDS @              \ fetch current from globals
DUP C.TYPE + @               \ fetch type from current
LOCALS| T.TYPE C.RECORDS          \ define locals
C.RECORDS C.END + @             \ high end of res.id range
C.RECORDS C.START + @           \ low end of res.id range
DO                     \ start loop
  C.RECORDS I TAB.OF  @       \ fetch tab of current record
  DUP IF                 \ if active
    RELEASE.RESOURCE
  ELSE DROP THEN            \ else drop handle
LOOP ;


: SET.CURRENT.RECORD, ASSEMBLER
CURRENT.RECORDS A0 )#MOVE,
A0 () SP -) LONG MOVE,           \ res.id,  records
NSWAP,                   \ records, res.id
  2DUP, TAB.OF,                record, res.id, tab
A0 POP,                  \ a0   address of table stack - record, res.id,
4 SP I) A1 LONG MOVEA,           \ a1   records
A0 () C.HANDLE A1 I) LONG MOVE,      \ table @ records c.handle !
SP )+ A1 () LONG MOVE,           \ res.id c.records !
DROP,                    \ drop c.records
;


: SET.CURRENT.RECORD             \ res.id # -- sets current
  CURRENT.RECORDS @             \ fetch current from global
  LOCALS| C.RECORD RES.ID           \ define locals
   C.RECORD RES.ID TAB.OF @         \ fetch current res handle
   C.RECORD C.HANDLE + !           \ store in c.handle
   RES.ID C.RECORD !  ;          \ store id in c.id


: CURRENT.CHANGED
 \ CURRENT.RECORDS @
 \ C.HANDLE + @
 \ CHANGED.RESOURCE
 ;

: CURRENT.RECORD CURRENT.RECORDS @ ;

1 CONSTANT BYTES                \ constants for data types
2 CONSTANT WORDS
4 CONSTANT LONGS

HEX
 4000000  CONSTANT LONG.TYPE       \ constant for long
 2000000  CONSTANT WORD.TYPE       \ constant for word
 1000000  CONSTANT BYTE.TYPE       \ constant for byte
 4000004  CONSTANT ONE.LONG.TYPE      \ constant for 1 long
  FFFFFF  CONSTANT TYPE.MASK
DECIMAL
```

```
 : ALIGN
   DUP 1 AND IF 1+ THEN ;

\ structure of resource.record info
\  long:  offset in record
\  long:  length and type

 : ADD.RESOURCE.RECORD                  \ creates new resource record
   0 LOCALS| THIS.COUNT TYPE MANY |
   CURRENT.COUNT @               \ counter for bytes in record
   TO THIS.COUNT              \ current record pointer
   TYPE MANY * THIS.COUNT +          \ offset for next record
   ALIGN                  \ even byte boundry
   CURRENT.COUNT !             \ set count for next record
   TYPE  MANY *              . \ type, length, offset
   TO MANY
   TYPE 24 SCALE
   MANY OR TO MANY
   CREATE
  THIS.COUNT ,
  MANY ,
   DOES>
   DUP >R  @                       \ const.add >R  offset for data
   CURRENT.RECORDS @
   C.HANDLE +  @ @ -               \ add offsets to start address
   R> 4+ @ ;                       \ address , length in bytes


 : RES.STATE                  \ behaves like record, is pluck and placeable
   CURRENT.RECORDS @            \ fetch current records address
   DUP @ TAB.OF 4+              \ fetch tab , add offset for state
   ONE.LONG.TYPE ;              \ state, type


 : NEXT.RECORD                 \ sets unused record as current
    CURRENT.RECORDS @             \ global for active record
    DUP C.START + @ 1-            \ start of res id's minus 1
    LOCALS| R.COUNT C.RECORDS          \ declare locals
  BEGIN
      R.COUNT 1- TO R.COUNT          \ increment id
      C.RECORDS R.COUNT
      TAB.OF 4+ @ 0 =           \ count up until inactive or the end of record
    R.COUNT C.RECORDS C.END - @ 1 - =   \ save one on end for scratch
  OR UNTIL
    R.COUNT C.RECORDS C.END - @ 1- = IF   \ remember the scratch object !
      0 TO R.COUNT            \ if end was reached set count to zero
  THEN
  R.COUNT ;


 : NO.MORE                 \ set current.record to 0
  0 CURRENT.RECORDS @  !          \ routines must check and call alert
  ;


 : NEW.RES.RECORD
  CURRENT.RECORDS @               \ fetch current records from global
  0 0 LOCALS| N.HANDLE RES.ID C.RECORDS
    NEXT.RECORD
  DUP TO RES.ID               \ set local
  IF
    C.RECORDS C.COUNT - @           \ fetch minimum count
    FROM.HEAP
```

```
    TO N.HANDLE              \ create handle and place in local
   N.HANDLE IF
     N.HANDLE C.RECORDS RES.ID      \ if handle is real
     TAB.OF !            \ store in tab for id
     1 C.RECORDS RES.ID TAB.OF 4+ !   \ set state to active
     RES.ID SET.CURRENT.RECORD      \ set id as current
     C.RECORDS C.DEFAULT + )@  IF   \ if default exists
       C.RECORDS C.DEFAULT + )@  \ fetch address of default
       N.HANDLE @          \ fetch pointer to memory
       C.RECORDS C.COUNT + @      \ fetch minimum count
       CMOVE             \ block move
     THEN
   ELSE  NO.MORE  THEN         \ else handle error
  ELSE NO.MORE THEN ;          \ else handle error


: RESIZE.RES.RECORD                      \  NewSize -- trys to resizes resource
  CURRENT.RECORDS @
  0  LOCALS| R.HANDLE C.RECORDS N.SIZE
  0 ?HEAP.SIZE MINHEAPSIZE > IF
    C.RECORDS C.RECORDS @ TAB.OF @  IF          \ check handle rather than state
      C.RECORDS C.RECORDS @ TAB.OF  @         \ handle
      TO R.HANDLE
      R.HANDLE N.SIZE RESIZE.HANDLE
      0  < IF
        -108 TO ERROR.FLAG 0
      ELSE
        -1
      THEN
    ELSE  -108 TO ERROR.FLAG 0  THEN
  ELSE  -108 TO ERROR.FLAG 0  THEN  ;


: CURRENT.HANDLE
  CURRENT.RECORDS @ DUP @ TAB.OF @ ;

: CURRENT.SIZE
  CURRENT.HANDLE HANDLE.SIZE ;


: DELETE.RES.RECORD
  CURRENT.RECORDS @
  LOCALS| C.RECORDS |
  C.RECORDS C.RECORDS @ TAB.OF @ HANDLE.SIZE 0> IF    \ check handle rather than state
    C.RECORDS C.RECORDS @ TAB.OF @ TO.HEAP
    0 C.RECORDS C.RECORDS @ TAB.OF 4+ !         \ set state
    0 C.RECORDS C.RECORDS @ TAB.OF !          \ set handle
  THEN ;


: DELETE.RECORDS
  CURRENT.RECORDS @                   \ use global current records
  LOCALS| C.RECORDS |
  C.RECORDS C.END + @                 \ find end
  C.RECORDS C.START + @                 \ and start of res.id's and loop
  DO
    I SET.CURRENT.RECORD
      DELETE.RES.RECORD
  LOOP ;


: OPEN.RESOURCE.FILE         \ address of file.type -- FILE.ID/TRUE OR FALSE )
  LOCALS| 'R.TYPE |
```

```
 REPLY 74 ERASE            \ clear reply block
 75 75 XY>POINT            \ set location of dialog
" Records"             \ prompt for dialog
 'R.TYPE 1 REPLY (GET.FILE)      \ file.type , filter type, reply block
  REPLY C@             \ good result boolean
  BOOLEAN DUP IF
  REPLY 6+ <W@ VOLREF# !     \ volume reference number
    IODIR OFF REPLY 10+      \ name of file to open
  ' 0 VOLREF# @ SETVOL     \ set volume to current
    OPEN.RES.FILE SWAP       \ open resource file
THEN ;
```

```
: 8MAP.LINE   ASSEMBLER
  D3 01 LONG SUBQ,
  PL IF,
   BEGIN,
   D4 SWAP,
   A1 () D4 Z.SIZE, CMP, LT IF,
     D4 A1 () Z.SIZE, MOVE,
     D1 Z.RECORD 2/  A1 I) Z.SIZE, MOVE,
     D2 PUSH,
     SP ()  D2 BYTE MOVE,
     D2 0 WORD A2 @I) A0 () BYTE MOVE,
     D2 POP,
   THEN,
   D4 SWAP,
   A1 Z.RECORD LONG ADDQ,
   A0 01 LONG ADDQ,
   D5 D4 LONG ADD,
   D7 D2 LONG ADD,      \ D2 IS COMPLEX ZBASE
  D3 WLOOP,
  THEN,  ;

: 8SMOOTHMAP.LINE   ASSEMBLER
  D3 01 LONG SUBQ,
  PL IF,
     BEGIN,
       D4 SWAP,
      A1 () D4 Z.SIZE, CMP, LT IF,
         D4 A1 () Z.SIZE, MOVE,
         D1 Z.RECORD 2/  A1 I) Z.SIZE, MOVE,
         D2 PUSH,
         SP () D2 BYTE MOVE,
         D2 0 WORD A6 @I) D0 WORD MOVE,
       D6 PUSH,
         SP () D6 BYTE MOVE,
         D6 0 WORD A2 @I) D0 BYTE MOVE,
         D0 0 WORD A3 @I) A0 () BYTE MOVE,
         D6 POP,
         D2 POP,
       THEN,
     D4 SWAP,
       A1 Z.RECORD LONG ADDQ,
     A0 01 LONG ADDQ,
       D5 D4 LONG ADD,
       A4 D6 LONG ADD,    \ d6 is complex base for shading
       D7 D2 LONG ADD,    \ d2 is complex base for mapping
   D3 WLOOP,
  THEN,
  ;
```

```
\ new poly routines for

: 8MAP.LINE   ASSEMBLER
   D3 01 LONG SUBQ,
   PL IF,
    BEGIN,
    D4 SWAP,
    A1 () D4 Z.SIZE, CMP, LT IF,
      D4 A1 () Z.SIZE, MOVE,
      D1 Z.RECORD 2/  A1 I) Z.SIZE, MOVE,
      D2 PUSH,
      SP ()  D2 BYTE MOVE,
      D2 0 WORD A2 @I) A0 () BYTE MOVE,
      D2 POP,
    THEN,
    D4 SWAP,
    A1 Z.RECORD LONG ADDQ,
    A0 01 LONG ADDQ,
    D5 D4 LONG ADD,
    D7 D2 LONG ADD,      \ D2 IS COMPLEX ZBASE
   D3 WLOOP,
   THEN,  ;


: 8SMOOTHMAP.LINE   ASSEMBLER
   D3 01 LONG SUBQ,
   PL IF,
      BEGIN,
        D4 SWAP,
       A1 () D4 Z.SIZE, CMP, LT IF,
          D4 A1 () Z.SIZE, MOVE,
          D1 Z.RECORD 2/  A1 I) Z.SIZE, MOVE,
          D2 PUSH,
          SP () D2 BYTE MOVE,
          D2 0 WORD A6 @I) D0 WORD MOVE,
        D6 PUSH,
          SP () D6 BYTE MOVE,
          D6 0 WORD A2 @I) D0 BYTE MOVE,
          D0 0 WORD A3 @I) A0 () BYTE MOVE,
          D6 POP,
          D2 POP,
        THEN,
      D4 SWAP,
        A1 Z.RECORD LONG ADDQ,
      A0 01 LONG ADDQ,
        D5 D4 LONG ADD,
        A4 D6 LONG ADD,    \ d6 is complex base for shading
      D7 D2 WORD ADD,    \ d2 is complex base for mapping
      D7 SWAP, D2 SWAP,    \ add word values to insure wrap-around
      D7 D2 WORD ADD,
      D7 SWAP, D2 SWAP,
    D3 WLOOP,
   THEN,
   ;
```

```
( SIDE/SECTION DRAW UTIL FOR SOLIDMODEL )          ( 101985 YH )
( COPYRIGHT 1985 BY YOUNG HARVILL        )
( ALL RIGHTS RESERVED                    )

   ANEW SOLID.DRAW

   CR ." Loading solid drawing utils..."

0  constant three.token

: three.list  three.token  execute ;


( TRANS.ALL.POINTS, PROJECTS, TRANSLATES ARRAY)    ( 041586 yh )


( rall, all, con, ccon,  d5 con#, d3 ccon#  d6 jloop, d4 iloop)
( set.clip.z Trans.all.points util )                ( 041586 yh )


\ TRANS.ALL.POINTS, PROJECTS, TRANSLATES ARRAY  011138 YH

 CODE TRANS.ALL.POINTS            ( -- MINX MAXZ
    SAVE.REGS
   8000000  LIT,
  -8000000  LIT,
  ' ^ALLPOINTS  A2 )#MOVE,        \ a2 is ^ ^all.points
  a2 () A2 LONG MOVE,           \ a2 is ^allPoints
  A2 () A2 LONG MOVE,           \ a2 is allpoints
    A2 () D0 LONG MOVE,          \ d0 is number of cross.section points
    04 A2 I) D7 LONG MOVE,         \ d6 is number cross.section
    D0 D7 MULS,              \ d6 is number of total points
    08 # A2 LONG ADDA,           \ add offset to data for all.points
  D7 01 LONG SUBQ,
  PL IF.L,
      BEGIN,
          A2 () D0 LONG MOVE,
            4 A2 I)  D1 LONG MOVE,
            8 A2 I)  D2 LONG MOVE,
     D2 PUSH, D1 PUSH, D0 PUSH,
     (CENTER),
     (SWIVEL),
     D0 POP, D1 POP, D2 POP,
     SCALER,
       OUT,
     SP () D0  LONG CMP, PL IF,
       D0 SP () LONG MOVE,
     THEN,
     4 SP I) D0  LONG CMP, MI IF,
       D0 4 SP I) LONG MOVE,
     THEN,
     D0  A2 )+  LONG MOVE,
           D1  A2 )+  LONG MOVE,
           D2  A2 )+  LONG MOVE,
     D7 LOOP,
  THEN,
    RESTORE.REGS
```

```
NEXT END-CODE


CODE PROJECT.ALL.POINTS
   SAVE.REGS
 ' ^ALLPOINTS  A2 )#MOVE,        \ a2 is ^ ^all.points
 a2 () A2 LONG MOVE,           \ a2 is ^allPoints
 A2 () A2 LONG MOVE,           \ a2 is allpoints
   A2 () D0 LONG MOVE,           \ d0 is number of cross.section points
   04 A2 I) D6 LONG MOVE,          \ d6 is number cross.section
   D0 D6 MULS,                \ d6 is number of total points
   08 # A2 LONG ADDA,           \ add offset to data for all.points
 D6 01 LONG SUBQ,
 PL IF.L,
     BEGIN,
         A2 () D0 LONG MOVE,
           4 A2 I)  D1 LONG MOVE,
           8 A2 I)  D2 LONG MOVE,
       NPROJECT,
         D0  A2 )-  LONG MOVE,
           D1  A2 )+  LONG MOVE,
           D2  A2 )+  LONG MOVE,
     D6 LOOP,
 THEN,
   RESTORE.REGS
 NEXT END-CODE


   ( z = d0 , y= d1, x = d2 )


( FROM.POLY.POINTS   )                                   ( 102785 SH )

decimal

: FROM.POLY.POINTS  >R
            POLY.POINTS TO.STACK  R@  FROM.STACK
            POLY.POINTS 12 + TO.STACK R@ 12 + FROM.STACK
              POLY.POINTS 24 + TO.STACK
              R@ 12 - SECTION.INC @ -  FROM.STACK
              POLY.POINTS 36 + TO.STACK
              R> SECTION.INC @ - FROM.STACK  ;



code TO.THE.POINTS ASSEMBLER
   save.regs
   #POLY.POINTS A0 )#MOVE,
   4 # A0 () LONG MOVE,
   A0 POP,
   SECTION.INC A1 )#MOVE,
   A1 () D3 LONG MOVE,
   SHADE.POINTS A1 )#MOVE,
   A0 () A1 () LONG MOVE,
   4 A0 I) 4 A1 I) LONG MOVE,
   8 A0 I) 8 A1 I) LONG MOVE,

   12 A0 I) 12 A1 I) LONG MOVE,
   16 A0 I) 16 A1 I) LONG MOVE,
   20 A0 I) 20 A1 I) LONG MOVE,

   D3 A0 LONG ADDA,
```

```
24 # A1 LONG ADDA,
24 # A2 LONG ADDA,
12 A0 I) A1 () LONG MOVE,
16 A0 I) 4 A1 I) LONG MOVE,
20 A0 I) 8 A1 I) LONG MOVE,

A0 () 12 A1 I) LONG MOVE,
4 A0 I) 16 A1 I) LONG MOVE,
8 A0 I) 20 A1 I) LONG MOVE,

restore.regs
next end-code



CODE TO.TRI.1POINTS
 save.regs
  #POLY.POINTS A0 )#MOVE,
  3 # A0 () LONG MOVE,
  A0 POP,
  SECTION.INC A1 )#MOVE,
  A1 () D3 LONG MOVE,
  ZBUFF.SCALE A1 )#MOVE,
  A1 () D1 LONG MOVE,
  SHADE.POINTS A1 )#MOVE,

  A0 () A1 () LONG MOVE,
  4 A0 I) 4 A1 I) LONG MOVE,
  8 A0 I) 8 A1 I) LONG MOVE,

  12 A0 I) 12 A1 I) LONG MOVE,
  16 A0 I) 16 A1 I) LONG MOVE,
  20 A0 I) 20 A1 I) LONG MOVE,


  D3 A0 LONG ADDA,
  24 # A1 LONG ADDA,
  24 # A2 LONG ADDA,
  12 A0 I) A1 () LONG MOVE,
  16 A0 I) 4 A1 I) LONG MOVE,
  20 A0 I) 8 A1 I) LONG MOVE,
 restore.regs
 NEXT END-CODE


CODE TO.TRI.2POINTS
  save.regs
   #POLY.POINTS A0 )#MOVE,
  3 # A0 () LONG MOVE,
  A0 POP,
  SECTION.INC A1 )#MOVE,
  A1 () D3 LONG MOVE,
  SHADE.POINTS A1 )#MOVE,

  A0 () A1 () LONG MOVE,
  4 A0 I) 4 A1 I) LONG MOVE,
  8 A0 I) 8 A1 I) LONG MOVE,

  D3 A0 LONG ADDA,
  12 # A1 LONG ADDA,

  12 A0 I) A1 () LONG MOVE,
  16 A0 I) 4 A1 I) LONG MOVE,
```

```
 20 A0 I) 8 A1 I) LONG MOVE,

 A0 () 12 A1 I) LONG MOVE,
 4 A0 I) 16 A1 I) LONG MOVE,
 8 A0 I) 20 A1 I) LONG MOVE,
restore.regs
NEXT END-CODE


( POLY.MESH  DRAWS FULL SHADED SOLID )            ( 020386 YH )

CODE >POLY.POINTS   \ ^3point -- store in shade.points and poly.points
 save.regs
 A0 POP,
 #POLY.POINTS A1 )#MOVE,
 A1 () D3 LONG MOVE,
 1 D0 MOVEQ,
 D3 D0 LONG ADD,
 D0 A1 () LONG MOVE,
 12 D0 MOVEQ,
 D0 D3 MULS,
 SHADE.POINTS A1 )#MOVE,
   D3 A1 LONG ADDA,
 A0 () A1 () LONG MOVE,
 4 A0 I) 4 A1 I) LONG MOVE,
 8 A0 I) 8 A1 I) LONG MOVE,
RESTORE.REGS
NEXT END-CODE


code TO.THE.NPOINTS ASSEMBLER
  save.regs
  d7 pop,

   #POLY.POINTS A0 )#MOVE,          \ set polypoints#
   4 # A0 () LONG MOVE,

    ' ^ALLPOINTS  A0 )#MOVE,        \ a0 is ^ ^all.points
   a0 () A0 LONG MOVE,          \ a0 is ^allPoints
   A0 () A0 LONG MOVE,          \ a0 is allpoints
  d7 a0 long adda,              \ a0 is ptr to the proper section
  SECTION.INC A1 )#MOVE,
  A1 () D3 LONG MOVE,
  SHADE.POINTS A1 )#MOVE,


  A0 () A1 () LONG MOVE,
  4 A0 I) 4 A1 I) LONG MOVE,
  8 A0 I) 8 A1 I) LONG MOVE,

  12 A0 I) 12 A1 I) LONG MOVE,
  16 A0 I) 16 A1 I) LONG MOVE,
  20 A0 I) 20 A1 I) LONG MOVE,

  D3 A0 LONG ADDA,
  24 # A1 LONG ADDA,

  12 A0 I) A1 () LONG MOVE,
  16 A0 I) 4 A1 I) LONG MOVE,
  20 A0 I) 8 A1 I) LONG MOVE,
```

```
 A0 () 12 A1 I) LONG MOVE,
 4 A0 I) 16 A1 I) LONG MOVE,
 8 A0 I) 20 A1 I) LONG MOVE,

' ^Normalpoints  A0 )#MOVE,          \ a0 is ^ ^normal.points
  a0 () A0 LONG MOVE,            \ a0 is ^normalPoints
  A0 () A0 LONG MOVE,            \ a0 is normalpoints
 d7 a0 long adda,                \ a0 is ptr to the proper section
 NORMAL.POINTS A1 )#MOVE,

   A0 () A1 () LONG MOVE,
 4 A0 I) 4 A1 I) LONG MOVE,
 8 A0 I) 8 A1 I) LONG MOVE,

 12 A0 I) 12 A1 I) LONG MOVE,
 16 A0 I) 16 A1 I) LONG MOVE,
 20 A0 I) 20 A1 I) LONG MOVE,

 D3 A0 LONG ADDA,
 24 # A1 LONG ADDA,

 12 A0 I) A1 () LONG MOVE,
 16 A0 I) 4 A1 I) LONG MOVE,
 20 A0 I) 8 A1 I) LONG MOVE,

 A0 () 12 A1 I) LONG MOVE,
 4 A0 I) 16 A1 I) LONG MOVE,
 8 A0 I) 20 A1 I) LONG MOVE,

restore.regs
next end-code


CODE TO.TRI.NIPOINTS
  save.regs
   d7 pop,

   #POLY.POINTS A0 )#MOVE,          \ set polypoints#
  3 # A0 () LONG MOVE,

    ' ^ALLPOINTS  A0 )#MOVE,        \ a0 is ^ ^all.points
   a0 () A0 LONG MOVE,           \ a0 is ^allPoints
   A0 () A0 LONG MOVE,           \ a0 is allpoints
  d7 a0 long adda,               \ a0 is ptr to the proper section
  SECTION.INC A1 )#MOVE,
  A1 () D3 LONG MOVE,
  SHADE.POINTS A1 )#MOVE,

  A0 () A1 () LONG MOVE,
  4 A0 I) 4 A1 I) LONG MOVE,
  8 A0 I) 8 A1 I) LONG MOVE,

  12 A0 I) 12 A1 I) LONG MOVE,
  16 A0 I) 16 A1 I) LONG MOVE,
  20 A0 I) 20 A1 I) LONG MOVE,

  D3 A0 LONG ADDA,
  24 # A1 LONG ADDA,
  12 A0 I) A1 () LONG MOVE,
  16 A0 I) 4 A1 I) LONG MOVE,
  20 A0 I) 8 A1 I) LONG MOVE,
```

```
' ^Normalpoints  A0 )#MOVE,          \ a0 is ^ ^normal.points
  a0 () A0 LONG MOVE,             \ a0 is ^normalPoints
  A0 () A0 LONG MOVE,             \ a0 is normalpoints
 d7 a0 long adda,                 \ a0 is ptr to the proper section
 NORMAL.POINTS A1 )#MOVE,

 A0 () A1 () LONG MOVE,
 4 A0 I) 4 A1 I) LONG MOVE,
 8 A0 I) 8 A1 I) LONG MOVE,

 12 A0 I) 12 A1 I) LONG MOVE,
 16 A0 I) 16 A1 I) LONG MOVE,
 20 A0 I) 20 A1 I) LONG MOVE,


 D3 A0 LONG ADDA,
 24 # A1 LONG ADDA,
 12 A0 I) A1 () LONG MOVE,
 16 A0 I) 4 A1 I) LONG MOVE,
 20 A0 I) 8 A1 I) LONG MOVE,

restore.regs
NEXT END-CODE


CODE TO.TRI.N2POINTS
   save.regs
  d7 pop,
    #POLY.POINTS A0 )#MOVE,          \ set polypoints#
   3 # A0 () LONG MOVE,
     ' ^ALLPOINTS  A0 )#MOVE,        \ a0 is ^ ^all.points
    a0 () A0 LONG MOVE,           \ a0 is ^allPoints
    A0 () A0 LONG MOVE,           \ a0 is allpoints
   d7 a0 long adda,               \ a0 is ptr to the proper section
   SECTION.INC A1 )#MOVE,
   A1 () D3 LONG MOVE,
   SHADE.POINTS A1 )#MOVE,

   A0 () A1 () LONG MOVE,
   4 A0 I) 4 A1 I) LONG MOVE,
   8 A0 I) 8 A1 I) LONG MOVE,

   D3 A0 LONG ADDA,
   12 # A1 LONG ADDA,

   12 A0 I) A1 () LONG MOVE,
   16 A0 I) 4 A1 I) LONG MOVE,
   20 A0 I) 8 A1 I) LONG MOVE,

   A0 () 12 A1 I) LONG MOVE,
   4 A0 I) 16 A1 I) LONG MOVE,
   8 A0 I) 20 A1 I) LONG MOVE,

   ' ^Normalpoints  A0 )#MOVE,        \ a0 is ^ ^normal.points
    a0 () A0 LONG MOVE,           \ a0 is ^normalPoints
    A0 () A0 LONG MOVE,           \ a0 is normalpoints
   d7 a0 long adda,               \ a0 is ptr to the proper section
   NORMAL.POINTS A1 )#MOVE,

   A0 () A1 () LONG MOVE,
   4 A0 I) 4 A1 I) LONG MOVE,
   8 A0 I) 8 A1 I) LONG MOVE,

   D3 A0 LONG ADDA,
```

```
12 # A1 LONG ADDA,

12 A0 I) A1 () LONG MOVE,
16 A0 I) 4 A1 I) LONG MOVE,
20 A0 I) 8 A1 I) LONG MOVE,

A0 () 12 A1 I) LONG MOVE,
4 A0 I) 16 A1 I) LONG MOVE,
8 A0 I) 20 A1 I) LONG MOVE,

restore.regs
NEXT END-CODE



( POLY.MESH  DRAWS FULL SHADED SOLID )          ( 020386 YH )


CODE >NPOLY.POINTS   \ offset in array  -- store in shade.points and poly.points
 save.regs
 d7 pop,
 ' ^ALLPOINTS  A0 )#MOVE,          \ a0 is ^ ^all.points
  a0 () A0 LONG MOVE,              \ a0 is ^allPoints
  A0 () A0 LONG MOVE,              \ a0 is allpoints
 d7 a0 long adda,                  \ a0 is ptr to the proper section
 #POLY.POINTS A1 )#MOVE,
 A1 () D3 LONG MOVE,
 1 D0 MOVEQ,
 D3 d0 LONG ADD,
 D0 A1 () LONG MOVE,
 12 D0 MOVEQ,
 D0 D3 MULS,                       \ d3 is section inc
 SHADE.POINTS A1 )#MOVE,
   D3 A1 LONG ADDA,
 A0 () A1 () LONG MOVE,
 4 A0 I) 4 A1 I) LONG MOVE,
 8 A0 I) 8 A1 I) LONG MOVE,
 ' ^Normalpoints  A0 )#MOVE,        \ a0 is ^ ^normal.points
  a0 () A0 LONG MOVE,              \ a0 is ^normalPoints
  A0 () A0 LONG MOVE,              \ a0 is normalpoints
 d7 a0 long adda,                  \ a0 is ptr to the proper section
 NORMAL.POINTS A1 )#MOVE,
   D3 A1 LONG ADDA,
 A0 () A1 () LONG MOVE,
 4 A0 I) 4 A1 I) LONG MOVE,
 8 A0 I) 8 A1 I) LONG MOVE,
RESTORE.REGS
NEXT END-CODE


: DRAW.ONE.SECTION
  0 SIDE !               \ side is the offset for the cross.section loop
  TRIANGLE.MESH? @ IF
    AllPoints 4+ @ 1 DO
          SIDE @
      SECTION @ +
            DUP              \ offset of this point on this cross.section
      TO.TRI.N1POINTS      \ write to shade points
           DRAW.POLY          \ draw the poly
      TO.TRI.N2POINTS      \ write to shade points
           DRAW.POLY          \ draw the poly
```

```
        SIDE @
     3POINT.LENGTH + SIDE !     \ increment the cross.section offset
   LOOP
  ELSE
    AllPoints 4- @ 1 DO
          SIDE @
      SECTION @ +
      TO.THE.NPOINTS
            DRAW.POLY           \ draw the poly
            SIDE @
      3POINT.LENGTH + SIDE !    \ increment the cross.section offset
          LOOP
  THEN ;


: FRONT.CAP                  \ writes complex poly front cap if needed
  3POINT.LENGTH               \ length of point record
  8 SECTION.INC @ 2* +          \ start of array
  RENDER.MODE @
  LOCALS| THE.RENDER THE.ALL OFF.POINT
  FRONT.CAP? @ IF               \ if we are using the cap...
   RENDER.MODE @ PHONG = IF
      SHADED RENDER.MODE !
    THEN                 \ if we are using the cap..
    0 #POLY.POINTS !          \ set the start edge count to zero
    AllPoints 4+ @   0 DO       \ loop through the cross section
      THE.ALL
    OFF.POINT -          \ we are counting backward...
      >NPOLY.POINTS          \ write the the points
        OFF.POINT 3POINT.LENGTH +     increment the offset
    TO OFF.POINT
    LOOP                 \ loop until done
 DRAW.POLY               \ draw the poly
 ELSE
   DRAW.ONE.SECTION          \ else draw the current.section
 THEN
 THE.RENDER RENDER.MODE ! ;


\ end cap

: END.CAP                  \ writes complex poly end cap if needed
  0                  \ start offset at zero
  8 SECTION.INC @
  AllPoints @ 2- * +           \ the start address of the cross section for the cap
  RENDER.MODE @
  LOCALS| THE.RENDER THE.ALL OFF.POINT |
  BACK.CAP? @ IF              \ if we are using the cap...
   RENDER.MODE @ PHONG = IF
      SHADED RENDER.MODE !
    THEN                 \ if we are using the cap..
    0 #POLY.POINTS !          \ zero the edge count for the poly
    AllPoints 4- @  0 DO        \ loop through the cross.section points
      THE.ALL
    OFF.POINT +          \ add start of the array to the offset
      >NPOLY.POINTS          \ write the points to shade and poly.points
         OFF.POINT 3POINT.LENGTH +   \ increment the offset
    TO OFF.POINT
    LOOP                 \ loop till done
   DRAW.POLY              \ draw the poly
  ELSE
     DRAW.ONE.SECTION        \ else draw the current.section
  THEN
```

```
THE.RENDER RENDER.MODE ! ;


\ poly mesh  Last Revision: 02/25/88  11:08:43 AM   YH
\ to handle complex poly endcaps on object
\ flag use.cap? must be set for this option to be used


: (POLY.MESH)              \ draws poly mesh object from AllPoints
   8 SECTION !             \ set start increment to first point in array
   AllPoints 4+ @            \ fetch count of points in a cross section
  3POINT.LENGTH *            \ * the point record length, is a length of a section
  SECTION.INC !
  AllPoints @ 2 > IF
    FRONT.CAP           \ test and do the front cap if needed,
    SECTION @ SECTION.INC @ +
    SECTION !           \ increment the pointer
    AllPoints @  3 DO       \ loop leaves out from and end caps
      DRAW.ONE.SECTION    \ else draw the current.section
        SECTION @
      SECTION.INC @ + SECTION !    \ increment the path offset
      LOOP
    END.CAP             \ check for an end.cap and write if needed
    4 #POLY.POINTS !
  ELSE
    AllPoints @ 1 > IF
      FRONT.CAP           \ draw front.cap if just 2 path points
    THEN
  THEN  ;

  FIND (POLY.MESH) constant  ^POLY.MESH


: POLY.MESH   ^POLY.MESH EXECUTE ;

\ Liner revised 2.24.87 to support variable screen size  YH
\ Liner routines updated for MacII  08/05/87  09:45:17 PM   YH


HEX
106 CONSTANT SCREEN.ROW
DECIMAL


\ LINER UTILS, SET.DIF, D.VAR

\ SET.DIFF sets up deltas  for bressenham line

: SET.DIFF  ASSEMBLER          \ X1 Y1 X2 Y2 -- X1 Y1 X2 Y2  D0-DX D1-DY
   02 SP@, D0 LONG MOVE,
   04 SP@, D0 LONG SUB,
   D0 ABS, D0 PUSH,            \ X1 Y1 X2 Y2 DX
   02 SP@, D1 LONG MOVE,
   04 SP@, D1 LONG SUB,
   D1 ABS, D1 PUSH,   ;         \ X1 Y1 X2 Y2 DX DY , D0-DX D1-DY

 \ d.var sets up error terms for bressenham line

  : D.VAR   ASSEMBLER
    D1 D3 LONG MOVE,           \ X1 Y1 X2 Y2 DX DY , D0-DX D1-DY
    D3 01 # LONG ASL, D3 PUSH,
    D0 D3 LONG SUB, D3 PUSH,      \ X1 Y1 X2 Y2 DX DY INCR1 D
    D0 D1 LONG SUB,
```

```
  D1 01 # LONG ASL, D1 PUSH, ;

\ X1 Y1 X2 Y2 DX DY INCR1 D INCR2

\ LINER UTILS, CHECK.X, SET.XINC          102785 YH

\ check.x  checks sign of delta x and swaps vars

 : CHECK.X ASSEMBLER       \ X1 Y1 X2 Y2 DX DY INCR1 D INCR2
   09 SP@, D5 LONG MOVE,
   07 SP@, D4 LONG MOVE,
   D4  D5 WORD CMP, PL IF,     \ word is used for test,
   D4 D5  EXG,
   08 SP@, D2 LONG MOVE,
   06 SP@, D3 LONG MOVE, ELSE,
   06 SP@, D2 LONG MOVE,
   08 SP@, D3 LONG MOVE, THEN, ;

\ set.xinc checks sign of x and sets sign of x increment

: SET.XINC  ASSEMBLER
   D3 D2 LONG CMP, MI IF,
   -1 D6 MOVEQ,  ELSE,
    1 D6 MOVEQ,  THEN, ;

\ X1 Y1 X2 Y2 DX DY INCR1 D INCR2  D5=X  D4=XEND D3=Y
\ LINER UTILS, SET.YINC, EXG.XY

\ set.yinc checks sign of y and sets sign of y increment

: SET.YINC ASSEMBLER
   D3 D2 LONG CMP, MI IF,
   D7 D6 LONG MOVE,
      D6 LONG NEG,   ELSE,
   D7 D6 LONG MOVE,  THEN, ;

\ exg.xy swaps x for y vars

 :  EXG.XY   ASSEMBLER       \ X1 Y1 X2 Y2 DX DY , D0-DX D1-DY
    2DROP,
    D2 POP, D3 POP,
    D4 POP, D5 POP,
    D4 PUSH, D5 PUSH,
    D2 PUSH, D3 PUSH,
    D1 D0 EXG,
    D0 PUSH, D1 PUSH, ;     \ Y1 X1 Y2 X2 DY DX , D0-DY D1-DX



 \ Y1 X1 Y2 X2 DY DX , INCR1 D INCR2  D5=Y  D4=YEND D3=X

hex

: OUTPUT.VARS ASSEMBLER
  0 d0 moveq,
  ThisSystem a0 )#move,
  0 SeHasColorQD a0 I) d0 byte move,
  d0 2 long cmpi, eq if,
    1 D0 MOVEQ,
    A05D W,
    D0 RP -) LONG MOVE,
```

```
then,
OUTPUT.ROW A0 )#MOVE,          \ use output.row global
A0 () D7 LONG MOVE,            \ d7 is screen.row
OUTPUT.BITS A1 )#MOVE,
A1 () A1 LONG MOVE,  ;         \ fetch current bitmap


: RESTORE.MMU ASSEMBLER
  0 d0 moveq,
  ThisSystem a0 )#move,
  0 SeHasColorQD a0 I) d0 byte move,
  d0 2 long cmpi, eq if,
    RP )+ D0 LONG MOVE,
    A05D W,
  then,
  ;

decimal


\ one bit line incremented along x

  CODE XLINE.1BIT
  >R,
  D.VAR                   \ set error terms
  CHECK.X                 \ check direction of increment and swap if needed
  SET.YINC                \ set sign of y increment
   02 SP@, D2 LONG MOVE,           \ d7   screen.width
   D7 D3 MULS,                  \  Y *  screen width
   SP () A0 LONG MOVE,            \ a0 is increment 2
   D3 A1 LONG ADDA,             \ add y position to current screen
   3 SP@, A2 LONG MOVE,           \ a2 is increment1
   BEGIN,
         D2 WORD TST, MI IF,        \ test accumulated error if negative
            A2 D2 WORD ADD,         \ add increment1 to error
            ELSE,
         D6 A1 LONG ADDA,      \ else increment the screen y
             A0 D2 WORD ADD, THEN, \ and add increment2 to error term
      D5 D1 WORD MOVE,            \ d1 is temp x pos
    D1 07 BYTE EORI,          \ reverse lower 3 bytes for bit# to set
    D5 D0 WORD MOVE,          \ d0 is temp x pos
    D0 03 # WORD ASR,         \ d0   tempx / 8  for x pos in bytes
    D0 0 WORD A1 @I) D1 BCHG,      \ set the bit on the screen
   D5 01 WORD ADDQ,               \ increment x
   D5 D4 WORD CMP, MI UNTIL,        \ loop until endx value is reached
   R>,
   RTS, END-CODE              \ return


\ one bit line incremented along y

  CODE YLINE.1BIT
  >R,
  EXG.XY                  \ swap y for x vars for this quadrant
  D.VAR                   \ set error terms
  CHECK.X                 \ swap for x var order
  SET.XINC                \ set sign of x increment
      02 SP@, D2 LONG MOVE,        \ d7 = screen.width
   SP () A0 LONG MOVE,           \ a0 = incr2
   3 SP@, A2 LONG MOVE,          \ a2 is increment1
   D7 D5 MULS,                \ y * screen width
   D7 D4 MULS,                \ yend * screen width
   A1 D4 LONG ADD,              \ add screen offset to endy for loop test
```

```
D5 A1 LONG ADDA,              \ add y offset to screen for current scan line
BEGIN,
        D2 WORD TST, MI IF,         \ check error term
        A2 D2 WORD ADD,         \ inc if negative
        ELSE,
   D6 D3 WORD ADD,         \ else increment x
        A0  D2 WORD ADD, THEN,     \ add increment2 to error term
     D3 D1 WORD MOVE,           \ d1 is tempx
 D1 07 BYTE EORI,           \ reverse low 3 bits for bit#
 D3 D0 WORD MOVE,           \ d0 is tempx
 D0 03 # WORD ASR,          \ d0 = tempx / 8 for byte on scan
 D0 0 WORD A1 @I) D1 BCHG,      \ set the bit
D7  A1 LONG ADDA,            \ increment y line
A1 D4 LONG CMP, MI UNTIL,        \ compare end scanline with current
R>, RTS, END-CODE            \ return


CODE LINER.1BIT               \ 1 bit line drawing primative
SAVE.REGS
OUTPUT.VARS
  SET.DIFF               \ set deltas for line
  D0 D1 LONG CMP, MI IF,          \ compare diffs
     ' XLINE.1BIT 4- BSR,  ELSE,       \ draw line increment by x
     ' YLINE.1BIT 4- BSR,  THEN,       \ draw line increment by y
  2DROP, 2DROP, DROP, 2DROP, 2DROP,   \ clear the stack
RESTORE.MMU
RESTORE.REGS NEXT END-CODE        \ end of forth routine


CODE XLINE.2BIT               \ draws 2 bit line incremented by x
>R,
D.VAR                  \ set error terms
CHECK.X                 \ check direction of increment and swap if needed
SET.YINC                \ set sign of y increment
 D2 SP@, D2 LONG MOVE,           \  d7 - screen.width
 D7 D3 MULS,              \  y *  screen width
 SP () A0 LONG MOVE,           \ a0 is increment 2
 D3 A1 LONG ADDA,            \ add y position to current screen
 3 SP@, A2 LONG MOVE,           \ a2 is increment1
 BEGIN, D5 01 WORD ADDQ,          \ increment x
        D2 WORD TST, MI IF,       \ test error term
           A2 D2 WORD ADD,        \ add increment1 to error term
           ELSE,
        D6 A1 LONG ADDA,     \ add 1 scanline to current screen line
            A0 D2 WORD ADD, THEN, \ add increment2 to error term
      D5 D1 WORD MOVE,           \ d1 is tempx
  D1 01 # BYTE ASL,          \ tempx * 2
  D1 07 BYTE EORI,          \ reverse low 3 bits for bit # to change
  D5 D0 WORD MOVE,          \ d0 is tempx
  D0 02 # WORD ASR,         \ tempx / 4 for byte x is on
  D0 0 WORD A1 @I) D1 BCHG,       \ set the bit
 D5 D4 WORD CMP, MI UNTIL,
 R>,
 RTS, END-CODE


CODE YLINE.2BIT
>R,
EXG.XY                 \ swap y for x vars for this quadrant
D.VAR                  \ set error terms
CHECK.X                 \ check direction of increment and swap if needed
```

```
SET.XINC
    02 SP@, D2 LONG MOVE,           \ d7 = screen.width
 SP () A0 LONG MOVE,               \ a0 = incr2
 3 SP@, A2 LONG MOVE,              \ a2 is increment1
 D7 D5 MULS,                    \ y * screen width
 D7 D4 MULS,                    \ yend * screen width
 A1 D4 LONG ADD,                  \ add screen to end y for loop test
 D5 A1 LONG ADDA,                 \ add y offset to current screen
 BEGIN, D7  A1 LONG ADDA,            \ increment y line
          D2 WORD TST, MI IF,         \ check error term
          A2 D2 WORD ADD,          \ add increment1 to error term
          ELSE,
    D6 D3 WORD ADD,          \ add increment2 to error term
          A0  D2 WORD ADD, THEN,      \ add a scanline to current scanline
      D3 D1 WORD MOVE,             \ d1 is tempx
  D1 01 # BYTE ASL,               \ tempx * 2
  D1 07 BYTE EORI,             \ reverse low 3 bytes for bit = to change
  D3 D0 WORD MOVE,             \ d0 is tempx
  D0 02 # WORD ASR,            \ tempx / 4 for byte to set bit in
  D0 0 WORD A1 @I) D1 BCHG,        \ set the bit
 A1 D4 LONG CMP, MI UNTIL,           \ continue until end scanline
 R>, RTS, END-CODE               \ return


CODE LINER.2BIT
SAVE.REGS
OUTPUT.VARS
  SET.DIFF                 \ set delta vars
  D0 D1 LONG CMP, MI IF,           \ check quadrant used
     ' XLINE.2BIT 4- BSR,  ELSE,       \ increment by x
     ' YLINE.2BIT 4- BSR,  THEN,       \ increment by y
  2DROP, 2DROP, DROP, 2DROP, 2DROP,   \ clear stack
RESTORE.MMU
RESTORE.REGS NEXT END-CODE          \ return



CODE XLINE.4BIT
>R,
D.VAR                   \ set error terms
CHECK.X                 \ check direction of increment and swap if needed
SET.YINC                \ set sign of y increment
 02 SP@, D2 LONG MOVE,             \  D7 = SCREEN.WIDTH
 D7 D3 MULS,                \  Y *  screen width
 SP () A0 LONG MOVE,             \ a0 is increment 2
 D3 A1 LONG ADDA,              \ add y position to current screen
 3 SP@, A2 LONG MOVE,             a2 is increment1
 BEGIN, D5 01 WORD ADDQ,           \ increment x position
        D2 WORD TST, MI IF,        \ test error term
           A2 D2 WORD ADD,         \ add increment 2 to error term
           ELSE,
        D6 A1 LONG ADDA,      \ add a scanline to current screen
            A0 D2 WORD ADD, THEN, \ add increment 2 to error term
      D5 D1 WORD MOVE,           \ d1 is tempx
  D1 02 # BYTE ASL,            \ tempx * 4
  D1 05 BYTE EORI,           \ invert bits
  D5 D0 WORD MOVE,           \ d0 is tempx
  D0 01 # WORD ASR,          \ tempx * 2 is byte of bit to change
  D0 0 WORD A1 @I) D1 BCHG,        change the bit
 D5 D4 WORD CMP, MI UNTIL,         \ if x exceeds endx then end
 R>,
 RTS, END-CODE
```

```
CODE YLINE.4BIT
>R,
EXG.XY                    \ swap y for x vars for this quadrant
  D.VAR                     \ set error terms
CHECK.X                   \ check direction of increment and swap if needed
SET.XINC
    02 SP@, D2 LONG MOVE,          \ d7 = screen.width
 SP () A0 LONG MOVE,             \ a0 = incr2
 3 SP@, A2 LONG MOVE,            \ a2 is increment1
 D7 D5 MULS,                   \ y * screen width
 D7 D4 MULS,                   \ yend * screen width
 A1 D4 LONG ADD,
 D5 A1 LONG ADDA,
 BEGIN, D7  A1 LONG ADDA,          \ increment y line
          D2 WORD TST, MI IF,        \ check error term
          A2 D2 WORD ADD,        \ add increment 2 to error term
          ELSE,
    D6 D3 WORD ADD,        \ add x increment to x
          A0  D2 WORD ADD, THEN,     \ add increment 1 to error term
      D3 D1 WORD MOVE,           \ d1 is temp x
  D1 02 # BYTE ASL,            \ tempx * 4
  D1 05 BYTE EORI,           \ invert low bits
  D3 D0 WORD MOVE,           \ d0 is tempx
  D0 01 # WORD ASR,          \ tempx * 2 for byte location
  D0 0 WORD A1 @I) D1 BCHG,      \ change the bit
 A1 D4 LONG CMP, MI UNTIL,         \ loop until done
 R>, RTS, END-CODE


CODE LINER.4BIT
SAVE.REGS
OUTPUT.VARS
  SET.DIFF                 \ set delta vars
  D0 D1 LONG CMP, MI IF,             \ check for which quadrant
     ' XLINE.4BIT 4- BSR, ELSE,       \ increment by x
     ' YLINE.4BIT 4- BSR, THEN,       \ increment by y
  2DROP, 2DROP, DROP, 2DROP, 2DROP,    \ clear the stack
RESTORE.MMU
RESTORE.REGS NEXT END-CODE


CODE XLINE.8BIT
>R,
D.VAR                     \ set error terms
CHECK.X                   \ check direction of increment and swap if needed
SET.YINC                  \ set sign of y increment
 02 SP@, D2 LONG MOVE,             \  d7 = screen.width
 D7 D3 MULS,                   \  Y *  screen width
 SP () A0 LONG MOVE,             \ a0 is increment 2
 D3 A1 LONG ADDA,              \ add y position to current screen
 3 SP@, A2 LONG MOVE,            \ a2 is increment1
 BEGIN, D5 01 WORD ADDQ,           \ increment x
        D2 WORD TST, MI IF,        \ test error term
           A2 D2 WORD ADD,         \ add increment 2 to error term
           ELSE,
        D6 A1 LONG ADDA,       \ add scanline to current screen
           A0 D2 WORD ADD, THEN,    \ add increment 1 to error term
      D5 0 WORD A1 @I) -1 BYTE EORI,   \ change the byte
 D5 D4 WORD CMP, MI UNTIL,         \ loop till done
 R>,
 RTS, END-CODE
```

```
CODE YLINE.8BIT
 >R,
 EXG.XY                  \ swap y for x vars for this quadrant
   D.VAR                   \ set error terms
 CHECK.X                 \ check direction of increment and swap if needed
 SET.XINC
     02 SP@, D2 LONG MOVE,         \ d7 = screen.width
  SP () A0 LONG MOVE,             \ a0 = incr2
  3 SP@, A2 LONG MOVE,            \ a2 is increment1
  D7 D5 MULS,                 \ y * screen width
  D7 D4 MULS,                 \ yend * screen width
  A1 D4 LONG ADD,
  D5 A1 LONG ADDA,
  BEGIN, D7  A1 LONG ADDA,         \ increment y line
          D2 WORD TST, MI IF,        \ check error term
          A2 D2 WORD ADD,          \ add increment 2 to error term
          ELSE,
     D6 D3 WORD ADD,          \ add x increment to current x
          A0  D2 WORD ADD, THEN,       \ add increment 1 to error term
     D3 0 WORD A1 @I) -1 BYTE EORI,     \ change the byte
     A1 D4 LONG CMP,              \ test for end x
   MI  UNTIL,                 \ loop till done
   R>, RTS, END-CODE


 CODE LINER.8BIT
 SAVE.REGS
 OUTPUT.VARS
   SET.DIFF                  \ set delta vars
   D0 D1 LONG CMP, MI IF,           \ check quadrant
       ' XLINE.8BIT 4- BSR,  ELSE,       \ increment by x
       ' YLINE.8BIT 4- BSR,  THEN,       \ increment by y
   2DROP, 2DROP, DROP, 2DROP, 2DROP,    \ clear stack
 RESTORE.MMU
 RESTORE.REGS NEXT END-CODE


( X.LIMIT UTILS SET.WINYS, X.LIMIT, Y.LIMIT )      ( 012886 YH )


 : SET.WINYS  ASSEMBLER  ( WINDOW LIMITS TO DATA REGISTERS )
   WINYMIN OLIT, A0 POPOFF,  A0 () D1 LONG MOVE,
   WINYMAX OLIT, A0 POPOFF,  A0 () D2 LONG MOVE,
   WINXMIN OLIT, A0 POPOFF,  A0 () D3 LONG MOVE,
   WINXMAX OLIT, A0 POPOFF,  A0 () D4 LONG MOVE, ;
  : X.LIMIT ASSEMBLER
    D3 D0 LONG CMP, PL IF,
    D0 D4 LONG CMP, MI IF,
    D4 D0 LONG MOVE, THEN,
    ELSE, D3 D0 LONG MOVE, THEN, ;
  : Y.LIMIT  ASSEMBLER
    D1 D0 LONG CMP, PL IF,
    D0 D2 LONG CMP, MI IF,
    D2 D0 LONG MOVE,  THEN,
    ELSE, D1 D0 LONG MOVE, THEN, ;



 ( NPOLY.FRAME VARS PUT.REDRAW, )               ( 121985 YH )
```

```
CODE 5DROP
   20 # SP LONG ADDA,
NEXT END-CODE

: PUT.REDRAW
  RECOUNT@ @ @ 8 +
  DUP REDRAW.LENGTH < IF
    DUP RECOUNT@ @ !
    REDRAW@ @ + >R
    R@ W! R@ 2+ W! R@ 4+ W! R> 6- W!
  ELSE 5DROP THEN  ;


( CLEAR.REDRAW, RE.TOGGLE, REDRAW )              ( 121985 YH )
 : CLEAR.REDRAW
     0 RECOUNT1 !  REDRAW.LIST1 REDRAW.LENGTH 16 + ERASE
     0 RECOUNT2 !  REDRAW.LIST2 REDRAW.LENGTH 16 + ERASE ;

 : RE.TOGGLE
     REDRAW@ @ REDRAW.LIST1 = IF
           REDRAW.LIST2 REDRAW@ !   RECOUNT2 RECOUNT@ !
     ELSE  REDRAW.LIST1 REDRAW@ !   RECOUNT1 RECOUNT@ ! THEN ;


 CODE  SET.ACUBE.BOUNDS             \ -- SETS BOUNDS
  SAVE.REGS
    ' ^ALLPOINTS A0 )#MOVE,
  A0 () A0 LONG MOVE,              \ a0 is ^allpoints
  a0 () A0 LONG MOVE,              \ a0 is allpoints
  A0 () D7 LONG MOVE,
  4 A0 I) D0 LONG MOVE,
  D0 D7 MULS,
  D7 02 LONG SUBQ,               \ D7 IS COUNT
  PL IF,
    8 A0 I) D0 LONG MOVE,          \ D0 IS MAXZ
    8 A0 I) D1 LONG MOVE,          \ D1 IS MINZ
     12 A0 I) D2 LONG MOVE,          \ D2 IS MAXY
     12 A0 I) D3 LONG MOVE,          \ D3 IS MINY
     16 A0 I) D4 LONG MOVE,          \ D4 IS MAXX
     16 A0 I) D5 LONG MOVE,          \ D5 IS MINX
       20 # A0 LONG ADDA,
  BEGIN,
    A0 () D0 LONG CMP, MI IF,
        A0 () D0 LONG MOVE, THEN,    \ set maximum z
    A0 () D1 LONG CMP, PL IF,
        A0 () D1 LONG MOVE, THEN,    \ set minimum z
    4 A0 I) D2 LONG CMP, MI IF,
        4 A0 I) D2 LONG MOVE, THEN,   \ set maximum y
    4 A0 I) D3 LONG CMP, PL IF,
        4 A0 I) D3 LONG MOVE, THEN,   \ set minimum y
    8 A0 I) D4 LONG CMP, MI IF,
        8 A0 I) D4 LONG MOVE, THEN,   \ set maximum x
    8 A0 I) D5 LONG CMP, PL IF,
        8 A0 I) D5 LONG MOVE, THEN,   \ set minimum x
    3POINT.LENGTH # A0 LONG ADDA,
  D7 LOOP,
  CUBE.BOUNDS A0 )#MOVE,
  D4 A0 )+ LONG MOVE,
```

```
D5 A0 )+ LONG MOVE,
D2 A0 )+ LONG MOVE,
D3 A0 )+ LONG MOVE,
D0 A0 )+ LONG MOVE,
D1 A0 () LONG MOVE,
THEN,
RESTORE.REGS
NEXT END-CODE
```

```
cr ." Executing Solid Model Script"

anew solid.script

: anew  -FIND  DROP  ; IMMEDIATE  \ dummy for anew to save tokens


FIND ASSEMBLER         ( and Assembler Vocab )
IFTRUE  " ASSEMBLER" GET.VOCAB ' ASSEMBLER :
cr  ." Reconfiguring Assembler..."  IFEND

200,000 minimum.object
 40,000 minimum.vocab

FALSE  CONSTANT 6800?
FALSE  CONSTANT SMALL.DISPLAY
FALSE  CONSTANT SMALL.ZBUFFER
100 CONSTANT MAX.TYPE.POINTS

INCLUDE" ASSEMBLER.UTILS"

INCLUDE" 68020 FIX.MATH"
INCLUDE" POLY.CREATES.8"
INCLUDE" SYSTEM.GLOBALS"
INCLUDE" CHECKENVIRONS"
INCLUDE" QDTRAPS"

SMALL.ZBUFFER IFTRUE
  INCLUDE" BYTE Z.CONSTANTS"
IFEND

SMALL.ZBUFFER NOT IFTRUE
  INCLUDE" WORD Z.CONSTANTS"
IFEND

INCLUDE" TRANS.68020"

CREATE -POLY.SEG.START-

\ utils to make code seg, these are forgotten

INCLUDE" POLY.MACROS"
INCLUDE" INIT.POLY.TRAPS"
INCLUDE" CodeSegUtils"

\ make 8 bit color code segment and save as resource

CREATE -8BIT.POLY-

INCLUDE" POLYHEADER"
INCLUDE" (SHADE.8)"
INCLUDE" POLY.DRAW"
INCLUDE" POLY.NORMAL.CLIP.68020"
INCLUDE" POLY.DRAW.MAP"
INCLUDE" BUFFER.POLY"
INCLUDE" COLOR.POLY"
INCLUDE" COLOR.POLY.PROCS.SEG"
INCLUDE" INIT.COLOR.POLY"

\ make a display seg for use with vcrs...

INCLUDE" DISPLAY.SEG"

\ forget all poly stuff plus set-up
```

```
FORGET -POLY.SEG.START-

INCLUDE" GLUE.POLY.PROC"

INCLUDE" CLEAR.BUFFERS"
INCLUDE" DOTS.8"
INCLUDE" (ZBUFF)"
INCLUDE" PARTIAL.SHADE.8"

INCLUDE" ERROR.ALERT"
INCLUDE" HEAP.UTILS"

INCLUDE" COLOR PICKER"
INCLUDE" RESOURCE.RECORDS"
INCLUDE" OBJECT.DEFINITIONS"
INCLUDE" OBJECT.PLUCK"
INCLUDE" COLOR.MANAGE"
INCLUDE" WINDOW.ARRAY"
INCLUDE" OBJECT.UTILITIES"
INCLUDE" SOLID.DRAW"          \ for fixed point shading
INCLUDE" 3.CURSORS"           \ for fixed point shading
INCLUDE" AVERAGENORMALS"
INCLUDE" BACKPORTINIT.8"
INCLUDE" PORTINITS"
INCLUDE" NEW.3LIST"

ROOM
```

```
\ writes tables for sphere shading

anew -shade.tables-

cr

." loading tables for shere shading "

127 DUP * CONSTANT RAD2

: write.zmap
  locals| the.map |
  256 0 do
    256 0 do
      I 128 - dup * j 128 - dup * +
      sqrt 129  < if
        RAD2
        J 128 -  dup * -
        I 128 -  dup * -
          abs sqrt 127 min -127 max
        128 +
      else
        0
      then
      THE.MAP J 8 SCALE + I + C!
    LOOP
  LOOP ;


: make.zmap
  0 locals| zmap |
  256 dup * from.heap to zmap
  zmap if
    zmap lock.handle
    zmap @ write.zmap
    zmap unlock.handle
    zmap
    ascii ZMAP
    128
    ""
    add.resource
    zmap write.resource
    zmap detach.resource
    zmap to.heap
    update.resources
  else
    true abort" unable to create zmap"
  then ;

make.zmap


create map.last  10 c, 20 c, 30 c, 40 c, 50 c, 100 c, 110 c, 120 c, 126 c, 127 c,

: write.rmap
  locals| the.map |
  the.map 127 erase
  map.last the.map 122 + 5 cmove
  ;


: make.rmap                    \ makes a 6th power look-up
  0 locals| rmap |
  128 from.heap to rmap
```

```
  rmap if
    rmap lock.handle
    rmap @ write.rmap
    rmap unlock.handle
    rmap
    ascii RMAP
    128
    ""
    add.resource
    rmap write.resource
    rmap detach.resource
    rmap to.heap
    update.resources
  else
    true abort" unable to create rmap"
  then ;

make.rmap

: write.byte.mult                \ writes the byte multiplicatiopn look-up
  locals| bmlt |
  256 0 do
    256 0 do
      I 128 -
      J 128 - *
      bmlt J 9 SCALE I 2* + + W!
    LOOP
  LOOP ;


: make.bmlt                  \ makes a byte multiplication look-up
  0 locals| bmlt |
  256 dup * 2* from.heap to bmlt
  bmlt if
    bmlt lock.handle
    bmlt @ write.byte.mult
    bmlt unlock.handle
    bmlt
    ascii BMLT
    128
    ""
    add.resource
    bmlt write.resource
    bmlt detach.resource
    bmlt to.heap
    update.resources
  else
    true abort" unable to create bmlt"
  then ;

make.bmlt
```

```
ANEW SYSTEM.GLOBALS

CR ." Loading System Globals ... "


\ OBJECT.DEFINITIONS

ASCII SWVL CONSTANT  "SWVL

\ pict comment local ids

  create Version$   ," Swivel 1.5.5c "
  create Copyright$   ," Copyright (c) 1988-1990"
  create Author$    ," Young Harvill"
  create Company$   ," VPL Research Inc."


  132 CONSTANT CURRENT.VERSION  \ version for meta.world
  CURRENT.VERSION CONSTANT OBJECT.KIND


\ object forms

  126   CONSTANT  POLYNORMAL.FORM
  127   CONSTANT  POLY.FORM
  128   CONSTANT  PATH.FORM
  129   CONSTANT  MESH.FORM
  130   CONSTANT  PICT.FORM
  131   CONSTANT  SKIN.FORM
  132   CONSTANT  OP.FORM      \ not implemented
  256   CONSTANT  NULL.FORM



   2 CONSTANT WORLD.OBJECT
   1 CONSTANT META.WORLD
   CREATE WORLD$  ," World                    "
   CREATE OBJECT$ ," Object                  "


 \ object states

  0 CONSTANT  UNUSED
  1 CONSTANT ACTIVE
  3 CONSTANT  SELECTED
   -3 CONSTANT MOVING


  VARIABLE SIZE.CONSTANT


\ color constants

  hex
  CREATE WHITE.RGB  FFFF W, FFFF W, FFFF W,
  CREATE BLACK.RGB  0 W, 0 W, 0 W,
  decimal

\ ERROR FLAGS
  GLOBAL ERROR.FLAG
  0 TO ERROR.FLAG
```

```
\ link types

 VARIABLE CURRENT.LINK

 2 BASE !
 1110000 CONSTANT POSITION.LOCK
 1000000 CONSTANT X.LOCK
 0100000 CONSTANT Y.LOCK
 0010000 CONSTANT Z.LOCK
 0001110 CONSTANT ATT.LOCK
 0001000 CONSTANT YAW.LOCK
 0000100 CONSTANT PITCH.LOCK
 0000010 CONSTANT ROL.LOCK
 0000001 CONSTANT SCALE.LOCK
 1111111 CONSTANT ALL.LOCK
 DECIMAL

 0 CONSTANT ALL.FREE



\ WINDOWS


  NEW.WINDOW C.BACKPORT
  NEW.WINDOW BW.BACKPORT



HEX

  FFFF CONSTANT MAC512
  7FFF CONSTANT MACPLUS
  3FFF CONSTANT MACII
  C000 CONSTANT COLOR.PORT.ID
  8000 CONSTANT ROW.BIT

 DECIMAL


 \ window globals

   VARIABLE OUTPUT.BITS
   VARIABLE OUTPUT.DEPTH
   CREATE   LAST.DEPTH 0 ,
   VARIABLE OUTPUT.ROW
   VARIABLE LINE.TOKEN
   VARIABLE WINYMIN    VARIABLE WINXMIN
     VARIABLE WINYMAX    VARIABLE WINXMAX
     VARIABLE SHUNTY     VARIABLE SHUNTX
     VARIABLE STARTY     VARIABLE STARTX


 \ define toolbox draw globals

 GLOBAL SWAP.FLAG
 GLOBAL CURRENT.APOLY.RECORD
 GLOBAL CURRENT.POLY.OFFSET
 GLOBAL POLY.ARRAY
 GLOBAL CURRENT.TPOLY.RECORD
 GLOBAL CURRENT.TPOLY.OFFSET
 GLOBAL TEMP.POLY.ARRAY
 GLOBAL POLY.COUNT
```

```
GLOBAL POLY.GLOBAL.RENDER
GLOBAL TEMP.PIX.PAT
GLOBAL POLY.HUNK.LIST
GLOBAL HUNK.POINTER


\ constants for max and min active.window area


    0 CONSTANT LEFT.BOUNDS
  512 CONSTANT RIGHT.BOUNDS
    0 CONSTANT TOP.BOUNDS
  330 CONSTANT BOTTOM.BOUNDS
   19 CONSTANT SCROLL.WIDTH
   24 CONSTANT V.TOOL.WIDTH
   20 CONSTANT V.TOOL.HEIGHT
   12  CONSTANT #V.TOOLS
  CREATE  DEFAULT.V.TOOL  1 ,
  CREATE  CURRENT.V.TOOL DEFAULT.V.TOOL @  ,

  CREATE V.TOOL.BOX  0 W, 0 W, #V.TOOLS V.TOOL.HEIGHT * W, V.TOOL.WIDTH W,



  CREATE WORK.SPACE.RECT
    TOP.BOUNDS     W,
    V.TOOL.WIDTH  W,
    ZBUFFERY @       W,
    ZBUFFERX @ V.TOOL.WIDTH -     W,


  : SET.WORK.SPACE.RECT
  TOP.BOUNDS V.TOOL.WIDTH ZBUFFERY @ ZBUFFERX @ V.TOOL.WIDTH - WORK.SPACE.RECT !RECT ;


  \ CONSTANTS AND VARS FOR TOOL AREA

  CREATE V.TOOLS.RECT    -1 W, -1 W, 0 W, 0 W,


\ NEW COSIGN TABLE
  10 CONSTANT ANGLE.SCALE
  360 ANGLE.SCALE * constant FULL.ANGLE
  HEX 10000  CONSTANT COS.SCALER DECIMAL

: >FIX.ANGLE
  ANGLE.SCALE * ;

: FIX.ANGLE>
  ANGLE.SCALE / ;


\ object vars and constants

   VARIABLE OBJECTX  0 OBJECTX !
   VARIABLE OBJECTY  0 OBJECTY !

\ HERE WE DEFINE OUR GRAPHIC AND SCALE CONSTANTS

HEX

  200 CONSTANT GRAPHIC.SCALE
  9 CONSTANT GRAPHIC.SHIFT  \ as a power of two
   40 CONSTANT NORMAL.SCALE    \ for graphic display
```

```
 6 CONSTANT NORMAL.SHIFT    \ as a power of two

  10000 CONSTANT SCALE.RANGE    \ as a power of two
   10  CONSTANT SCALE.SHIFT
  100000 CONSTANT   SCALE.MAX
 8  CONSTANT  SCALE.MIN
   A  CONSTANT FIX.SCALE
 1 FIX.SCALE SCALE 2/ CONSTANT FIX.SCALE/2

DECIMAL

   FIX.SCALE GRAPHIC.SHIFT -      \ difference in scales
   GRAPHIC.SHIFT NORMAL.SHIFT -    \ difference in normal graphic scale
   - CONSTANT TOTAL.SCALE.SHIFT    \ calculate total shift for translation

   1 TOTAL.SCALE.SHIFT abs SCALE 2/
   CONSTANT TOTAL.SCALE/2


   : SHIFT.SCALE  assembler
   LOCALS  R2 R1
   TOTAL.SCALE.SHIFT 0 < if
    R1 R2 LONG TST, MI IF,
      R1 R2 TOTAL.SCALE/2 NEG LONG ADDQ,
    ELSE,
      R1 R2 TOTAL.SCALE/2 LONG ADDQ,
    THEN,
    R1 R2 TOTAL.SCALE.SHIFT ABS # LONG ASR,
   ELSE
    TOTAL.SCALE.SHIFT IF
      R1 R2 TOTAL.SCALE.SHIFT # LONG ASL,
    THEN
   THEN ;


   CREATE SC  SCALE.RANGE ,


 \ viewer's normal to screen

 create XVIEWNORMAL SCALE.RANGE 2/ ,
 create yVIEWNORMAL SCALE.RANGE 2/ ,


 \ object 3d measurement and grid

   1000 constant decimal.scale

   create default.screen.to.measure  72  decimal.scale *  ,
   create default.ruler.unit decimal.scale ,
   create default.scale.unit decimal.scale ,
   create default.measure.scale 0 ,
   create default.measure.ref   0 ,
   create default.measure.div  10 ,

   create fix.measure.base   10 ,              \ base of fractional units
   create fix.measure.places   3 ,              \ number of places below decimal point
   create fix.measure.char   ascii . ,            \ character used to start fraction
   create fix.screen.to.measure  72  decimal.scale *  ,  \ number of fixed units to measure units
   create fix.measure.div    10 ,

 \ object 2d measure and grid

   100 constant measure.scale                 \ common denominator in measure units to screen units
```

```
  create screen.to.measure  72 GRAPHIC.SCALE * NORMAL.SCALE / DUP , ,      number of screen units to measure
  create div.units      10 , 10 ,

\ distance and perspective measures

  1000 72 * CONSTANT POS.RANGE

 HEX

   CREATE DISTANCE            0 ,
   CREATE O.CENTER        0 , 0 , 0 ,

 DECIMAL

\ cosine definitions

 4 CONSTANT COS.SIZE
 COS.SIZE 6 * CONSTANT COS.LENGTH
 : COS.ASIZE assembler long ;

 CODE COS!
   A0 POP, D0 POP,
   D0 A0 () COS.ASIZE MOVE,
   NEXT END-CODE

CODE COS@
   A0 POP,
   0 D0 MOVEQ,
   A0 () D0 COS.ASIZE MOVE,
   D0 PUSH,
   NEXT END-CODE

: COS,
  HERE COS.SIZE ALLOT
  COS! ;

  VARIABLE COSINES COS.LENGTH ALLOT
    COSINES     DUP  )CONSTANT YAW.SIN
  COS.SIZE + DUP  )CONSTANT YAW.COS
    COS.SIZE + DUP  )CONSTANT PITCH.SIN
  COS.SIZE + DUP  )CONSTANT PITCH.COS
    COS.SIZE + DUP  )CONSTANT ROLL.SIN
  COS.SIZE +     )CONSTANT ROLL.COS

  VARIABLE O.COSINES COS.LENGTH ALLOT

  ( t.vars )

    VARIABLE T.VARS COS.LENGTH ALLOT
    T.VARS      DUP  )CONSTANT TYAW.SIN
  COS.SIZE + DUP  )CONSTANT TYAW.COS
    COS.SIZE + DUP  )CONSTANT TPITCH.SIN
  COS.SIZE + DUP  )CONSTANT TPITCH.COS
    COS.SIZE + DUP  )CONSTANT TROLL.SIN
  COS.SIZE +     )CONSTANT TROLL.COS
```

```
CREATE ORTHO.COS      0 COS, COS.SCALER COS,
         0 COS, COS.SCALER COS,
         0 COS, COS.SCALER COS,


  CREATE Z.LIMITS  254 , -254 ,                    \ limits zbuffer clips to
CREATE FIX.Z.LIMITS  254 FIX.SCALE SCALE , -254 FIX.SCALE SCALE ,   \ limits zbuffer clips to
ZBUFFERY @ ZBUFFERX @ * 2* CONSTANT ZBUFF.LENGTH          \ length of zbuffer



  32 CONSTANT COLOR.STEPS
    CREATE ZCONSTANT  57 ,
    VARIABLE PRANGE


  VARIABLE SHADE.INDEX 256 ALLOT
  VARIABLE TEMP.RGB 8 ALLOT

  HEX

  FFFF  CONSTANT  COLOR.SCALE     \ scale of color calc
    88  CONSTANT  COLOR.MIN       \ minimum color

  GLOBAL MONOCHROME?

  0 TO MONOCHROME?


    GLOBAL COLOR.SHADE.RANGE

  COLOR.SCALE 10 / CONSTANT WARM.EFFECT
    COLOR.SCALE 10 / CONSTANT COOL.EFFECT
    COLOR.SCALE 3 / 2* CONSTANT COOL.CENTER

    COLOR.SCALE  CONSTANT CONTRAST.RANGE
    COLOR.SCALE 4 / CONSTANT BRIGHT.OFFSET
  COLOR.SCALE 3 / CONSTANT SHADOW.SCALE


DECIMAL

\ scale for percent of range object uses, scaled by 100

  GLOBAL OBJECT.CONTRAST
  60 TO OBJECT.CONTRAST



  HEX
    CREATE REFLECTO      6E    ,           reflectance of object scaled to
    9 CONSTANT RANGE.BRIGHT
  DECIMAL

  2 CONSTANT WireFrame
      3 CONSTANT HiddenLine
      4 CONSTANT ShadedLine
      5 CONSTANT Shaded
  6 CONSTANT Phong
  7 CONSTANT Zrender
  8 CONSTANT ZOrender
```

```
CREATE RENDER.MODE  Shaded ,

\ poly drawing vars

CREATE ALT.POLY 0 ,     \ flag for how poly is drawn
CREATE ALT.BUFF 0 ,
VARIABLE CURRENT.POLY.RECORD

\ side, cross section vars

 4  CONSTANT 2POINT.LENGTH

MAX.TYPE.POINTS 2+ 2POINT.LENGTH *  CONSTANT C.TYPE.LENGTH

C.TYPE.LENGTH 0 *   CONSTANT    UPSIDE
C.TYPE.LENGTH 1 *   CONSTANT    DOWNSIDE
C.TYPE.LENGTH 2 *   CONSTANT  UPTOP
C.TYPE.LENGTH 3 *   CONSTANT  DOWNTOP
C.TYPE.LENGTH 4 *   CONSTANT  CTYPE.RECORD
C.TYPE.LENGTH 5 *   CONSTANT  TYPE.RECORD

CREATE IN.OBJECT.DRAWING  0 ,
CREATE USE.CUBE.CONTOURS? 0 ,

VARIABLE DEFAULT.TYPE TYPE.RECORD  ALLOT
DEFAULT.TYPE TYPE.RECORD ERASE

VARIABLE CONTOUR TYPE.RECORD  ALLOT
CONTOUR TYPE.RECORD ERASE

VARIABLE CCONTOUR TYPE.RECORD  ALLOT
CCONTOUR TYPE.RECORD ERASE

\  form render constants for bit flags in object.form.render

2 BASE !
1     CONSTANT CULL.BACK.BIT
10    CONSTANT TRIANGLE.MESH.BIT
100   CONSTANT FRONT.CAP.BIT
1000  CONSTANT BACK.CAP.BIT
DECIMAL

CREATE FRONT.CAP? 0 ,
CREATE BACK.CAP?  0 ,
CREATE TRIANGLE.MESH?  0 ,

CREATE SIDER          UPSIDE ,
CREATE STRETCH.CHECK    0 ,
CREATE CURRENT.POINT    4 ,
CREATE CURRENT.CPOINT   4 ,
CREATE TYPE#            0 ,
VARIABLE OFFSIDE
VARIABLE CTYPE#

\ vars and constants for poly mesh stuff
```

```
MAX.TYPE.POINTS DUP * 3POINT.LENGTH * 16 -
CONSTANT ALL.POINT.LENGTH

0 CONSTANT  ^NormalPoints

  0 CONSTANT  ^ALLPOINTS
  VARIABLE ALL.POINTS#

: AllPoints ^ALLPOINTS @ ;
: NormalPoints ^NormalPoints @ ;


VARIABLE SECTION
VARIABLE SIDE
VARIABLE SECTION.INC

2976 CONSTANT REDRAW.LENGTH

VARIABLE RECOUNT1 0 RECOUNT1 !
  VARIABLE RECOUNT2 0 RECOUNT2 !
  VARIABLE REDRAW.LIST1 REDRAW.LENGTH 16 - ALLOT
  VARIABLE REDRAW.LIST2 REDRAW.LENGTH 16 - ALLOT
  VARIABLE  REDRAW@   VARIABLE RECOUNT@

VARIABLE LAST.DRAWN   0 LAST.DRAWN !
VARIABLE CUBE.FLAG    0 CUBE.FLAG !
VARIABLE EDGE.ONLY    0  EDGE.ONLY !
VARIABLE DRAWEND


CREATE BIT.PLANES 1 ,

: CALC.BUFF.SIZE
  LOCALS| X.SIZE Y.SIZE |
  X.SIZE
  8 BIT.PLANES @ - /
  Y.SIZE *
  X.SIZE Y.SIZE * 2* + ;


: NULL.OPERATION ;

FIND NULL.OPERATION CONSTANT NULL.TOKEN
FIND NULL.OPERATION CONSTANT OBJECT.CHANGE.TOKEN

HEX

10000 CONSTANT MINHEAPSIZE

DECIMAL

CREATE NO.MEMORY.OPERATION NULL.TOKEN ,
```

```
\ TRANSLATION
\ routines to handle two and three dimensional translations
\ revised to 32 bit 4/10/87 by Young Harvill


( FORTH Blocks Load Block )                          ( 012786 YH )

  CR
  ."  Loading translation utils..."


ANEW  TRANSLATION.UTILS



HEX
  A9A0 CONSTANT _GETRESOURCE
DECIMAL

 CODE (COS)             \ cosine primative
   0 D1 MOVEQ,
   D1 PUSH,
   ASCII CSTB LIT,
   130 # SP -) WORD MOVE,
   _GETRESOURCE W,         \ get resource
   A0 POP,
   A0 D2 LONG MOVE,
   D2 LONG TST, NE IF,
      D0 POP,              \ d0 is angle
      D0 FULL.ANGLE 2* LONG ADDI,
      FULL.ANGLE # D1 WORD MOVE,   \ for degree ranging
      D1 D0 DIVS,            \ divide n/360
      D0 SWAP,            \ lo word is now mod
      D0 LONG EXT,         \ ext
      A0 () A0 LONG MOVE,
      D0 2 # LONG ASL,     \ d0 is index to long
      D0 0 WORD A0 @I)     \ fetch indexed table entry into d1
      D1 LONG MOVE,
      D1 PUSH,
   ELSE,
    DROP, 0 LIT,
   THEN,
   NEXT, END-CODE


: SIN             \ angle -- sine scaled to 10000
   full.angle 4/  -           \ angle (sin) = angle - 90 (cos)
  (COS) ;


 : COS            \ angle -- cosine scaled to 10000
  (COS) ;


 2000 constant ThetaResol

 VARIABLE DIFY  VARIABLE DIFX


  : THETA                       ( sin cos -- almost an angle  )
    2DUP 0 = SWAP  0= AND IF    ( if both are zero, then 0    )
      2DROP 0
```

```
ELSE
  2DUP  DIFY ! DIFX !
  ABS SWAP ABS +              ( x y ax - ay )
  >R DIFY @ ThetaResol * R> /      ( dify / (dify + difx) )
  DIFX @ 0 < IF               ( 0 to 90 scale to 1000 )
    ThetaResol 2* SWAP -      ( if negative difx, second quadrant )
  ELSE
    DIFY @ 0 < IF             ( if negative dify, forth quadrant )
      ThetaResol 4* -
    THEN
  THEN
THEN  ;          ( now 90 is scaled to 1000 )


: ANGLE ( COS SIN | ANGLE )
  THETA 2*
  ASCII CSTB 131 GET.RESOURCE
  LOCALS| THETA.RES THETA.NUM |
  THETA.RES @ IF
    THETA.NUM THETA.RES @ - W@
  ELSE
    0
  THEN ;

: 3ANGLE
ANGLE >R ANGLE >R ANGLE R> R> ;

DECIMAL

: SCALE.COS, ASSEMBLER
    D0 POP,
  D0 SWAP,
  D0 LONG EXT,
  D0 PUSH, ;


CODE SCALE.COS
   SCALE.COS,
   NEXT END-CODE

hex

1 SCALE.SHIFT SCALE 1 - CONSTANT SCALE.MASK


  :  FIX.SCALE, ASSEMBLER        \ dn1 dn2 -- term in dn2
    REG1 2! REG2 2!
    0 D0 MOVEQ,
    REG2 2@ D0 REG1 2@ LONG MULS,
    D0 SWAP,
    0 # D0 WORD MOVE,
    0 # REG1 2@ WORD MOVE,
    REG1 2@ SWAP,
    D0 REG1 2@ LONG ADD, ;


: FIX.UNSCALE, ASSEMBLER
  REG1 2! REG2 2!
  REG1 2@ D0 LONG MOVE,
  D0 SWAP,
  D0 LONG EXT,
```

```
REG1 2@ SWAP,
REG1 2@ WORD CLR,
REG2 2@ D0 REG1 2@ LONG DIVS, ;


CODE (FIX.SCALE)      \   scalee scaler -- n
  D1 POP, D2 POP,
    D1 D2 FIX.SCALE,
  D2 PUSH,
NEXT END-CODE


CODE (FIX.UNSCALE)       \ scalee scaler -- n
  D1 POP, D2 POP,
    D1 D2 FIX.UNSCALE,
  D2 PUSH,
NEXT END-CODE


variable reg3 8 allot

: LONG.MUL.DIV,   ASSEMBLER     \ REGN REG* REG/ -- REGN
  REG3 2! REG2 2! REG1 2!
  0 D0 MOVEQ,
  REG2 2@ D0 REG1 2@ LONG MULS,
  REG3 2@ LONG TST, NE IF,
    REG3 2@ D0 REG1 2@ LONG DIVS,
  ELSE,
    0 REG1 2@ MOVEQ,
  THEN, ;


HEX
  3FFF CONSTANT WORD.RANGE

  : FIX.ROUND,  ASSEMBLER
    REG1 2!
    REG1 2@ LONG TST, MI IF,
      REG1 2@ LONG NEG,
      REG1 2@ FIX.SCALE/2 LONG ADDI,
      REG1 2@ D3 LONG ASR,
      REG1 2@ WORD.RANGE LONG CMPI, PL IF,
        WORD.RANGE # REG1 2@ LONG MOVE,
      THEN,
      REG1 2@ LONG NEG,
    ELSE,
      REG1 2@ FIX.SCALE/2 LONG ADDI,
      REG1 2@ D3 LONG ASR,
      REG1 2@ WORD.RANGE LONG CMPI, PL IF,
        WORD.RANGE # REG1 2@ LONG MOVE,
      THEN,
    THEN, ;

DECIMAL

   : FIX>INTEGER, ASSEMBLER
    D3 RPUSH,
    FIX.SCALE D3 MOVEQ,
    D0  FIX.ROUND,
    D1  FIX.ROUND,
    D2  FIX.ROUND,
```

```
  D3 RPOP, ;


  : INTEGER>FIX, ASSEMBLER
   D3 RPUSH,
   FIX.SCALE D3 MOVEQ,
   D0 D3 LONG ASL,
   D1 D3 LONG ASL,
   D2 D3 LONG ASL,
   D3 RPOP, ;


 CODE  FIX>INTEGER
   D0 POP, D1 POP, D2 POP,
   FIX>INTEGER,
   D2 PUSH, D1 PUSH, D0 PUSH,
 NEXT END-CODE


 CODE  INTEGER>FIX
   D0 POP, D1 POP, D2 POP,
   INTEGER>FIX,
   D2 PUSH, D1 PUSH, D0 PUSH,
 NEXT END-CODE


( PROJECT, OUT, IN, DISTANCE  3D UTILS )          ( 012786 yn )


: NPROJECT,    ASSEMBLER              ( X Y Z -- projected X Y Z )
  ORTHOGRAPHIC A0 )#MOVE,
  A0 () LONG TST, EQ IF,
    D4 RPUSH,
    D5 RPUSH,
    D0 D5 LONG MOVE,           \ save Z fixed point TO D5
    CDISTANCE A1 )#MOVE,
    A1 () D4 LONG MOVE,
    D4 D3 LONG MOVE,
    D0 D4 LONG ADD,            \ add fixed viewing distance
    D4  40 10 SCALE LONG CMPI, MI IF,
        40 10 SCALE # D4 LONG MOVE,    \ clip z to near threshold
    THEN,
    D1 D3 D4 LONG.MUL.DIV,
    D2 D3 D4 LONG.MUL.DIV,
    D5 D3 D4 LONG.MUL.DIV,
    D5 D0 LONG MOVE,
   D5 RPOP,
   D4 RPOP,
   THEN,  ;


 : UNNPROJECT,    ASSEMBLER             ( X Y Z -- projected X Y Z )
  ORTHOGRAPHIC A0 )#MOVE,
  A0 () LONG TST, EQ IF,
    D4 RPUSH,
    D5 RPUSH,
    D0 D5 LONG MOVE,         \ save Z fixed point TO D5
    CDISTANCE A1 )#MOVE,
    A1 () D4 LONG MOVE,
    D4 D3 LONG MOVE,
    D0 D4 LONG ADD,          \ d3 is fixed distance
    D1 D4 D3 LONG.MUL.DIV,
```

```
 D2 D4 D3 LONG.MUL.DIV,
 D5 D4 D3 LONG.MUL.DIV,
 D5 D0 LONG MOVE,
D5 RPOP,
D4 RPOP,
THEN,  ;


: >UN.PROJECT,  ASSEMBLER   ( X Y Z )
 ORTHOGRAPHIC A0 )#MOVE,
 A0 () LONG TST, EQ IF,
    D0 POP, D1 POP, D2 POP,
    CDISTINT A0 )#MOVE,
    A0 () D3  LONG MOVE,
  D3 D4 LONG MOVE,
    D0 D4 LONG SUB,             \ cdistance - z'
  D3 D0 MULS,           \ z' * d
  D4 D0 RDIVS,          \ z = (z'*d)/(d-z')
  D0 LONG EXT,
  D0 D4 LONG MOVE,
  D3 D4 LONG ADD,           \ add cdistance
      D4 D1 MULS,                  \ cdistance * y
      D4 D2 MULS,              \ cdistance * x
  D3 D1 RDIVS,                 \ cdistance * y / Z
      D1 LONG EXT,
      D3 D2 RDIVS,
      D2 LONG EXT,
    D2 PUSH, D1 PUSH, D0 PUSH,
THEN, ;


: PROJECT>,  ASSEMBLER   ( X Y Z )
 ORTHOGRAPHIC A0 )#MOVE,
 A0 () LONG TST, EQ IF,
    CDISTINT A0 )#MOVE,
    A0 () D3 LONG MOVE,
    D0 POP, D1 POP, D2 POP,
  D0 D4 LONG MOVE,
    D3  D4 LONG ADD,
    D3 D1 MULS,                 ( cdistance * y )
    D3 D2 MULS,           ( cdistance * x )
  D3 D0 MULS,
    D4 WORD TST, EQ IF,          ( if z = 0 then z = 1 )
       1 D4 MOVEQ, THEN,
       D4 D1 RDIVS,              ( cdistance * y / Z )
          D1 LONG EXT,
       D4 D2 RDIVS,
          D2 LONG EXT,
   D4 D0 RDIVS,
    D0 LONG EXT,
    D2 PUSH, D1 PUSH, D0 PUSH,
 THEN,  ;


 CODE NPROJECT
   D0 POP,  D1 POP,  D2 POP,
  NPROJECT,
   D2 PUSH, D1 PUSH, D0 PUSH,
 NEXT END-CODE

 CODE UNPROJECT
  >UN.PROJECT,
  NEXT END-CODE
```

```
: SET.SCALE   SCALE.RANGE 100 * SWAP /  SC ! ;


( SCALER, SET.SCALE )                              ( 032186 yh )

: SCALER, ASSEMBLER           \ scales by sc,
  D4 RPUSH,
  SC A0 )#MOVE,
  A0 () D4 LONG MOVE,           \ d4 = sc
  D0 D3 LONG MOVE,            \ D3 IS Z
  D4 D3 FIX.SCALE,              \ do the scaling
  D4 D1 FIX.SCALE,
  D4 D2 FIX.SCALE,
  D3 D0 LONG MOVE,
  D4 RPOP,  ;                 \ restore d4


CODE SCALER                   \ x y z -- scaled x y z
  D0 POP, D1 POP,  D2 POP,
  SCALER,
  D2 PUSH, D1 PUSH, D0 PUSH,
  NEXT END-CODE


(  UP.SCALER )                                     ( 081686 YH )


  CODE UP.SCALER
 SAVE.REGS
   D1 POP, D2 POP,  D3 POP,
   SC OLIT, A0 POPOFF,
   A0 () D4 LONG MOVE,
   D4 D1 FIX.UNSCALE,
   D4 D2 FIX.UNSCALE,
   D4 D3 FIX.UNSCALE,
   D3 PUSH, D2 PUSH, D1 PUSH,
 RESTORE.REGS
   NEXT END-CODE


(  EQU.SCALER )                                    ( 081686 YH )

  CODE EQU.SCALER
 SAVE.REGS
   D1 POP, D2 POP,  D3 POP,
   SC OLIT, A0 POPOFF,
   A0 () D4 LONG MOVE,
   D4 D1 FIX.SCALE,
   D4 D2 FIX.SCALE,
   D4 D3 FIX.SCALE,
   D3 PUSH, D2 PUSH, D1 PUSH,
 RESTORE.REGS
   NEXT END-CODE

( 2EQU.SCALER )                                    ( 081686 YH )


  : 2EQU.SCALER
    >R >R >R  equ.SCALER
    R> R> R>  equ.SCALER  ;
```

```
HEX

( FIX.UP, FIX.DOWN )                                    ( 110886 YH )

: FIX.UP, ASSEMBLER
     D0 POP, D1 POP, D2 POP,
     D0 2 # LONG ASL,
   D1 2 # LONG ASL,
     D2 2 # LONG ASL,
     D2 PUSH, D1 PUSH, D0 PUSH, ;

: FIX.DOWN,  ASSEMBLER
     D0 POP, D1 POP, D2 POP,
     D0 2  LONG ADDI,  D1 2  LONG ADDI,
     D2 2  LONG ADDI,
     D0 2 # LONG ASR,
     D1 2 # LONG ASR,
     D2 2 # LONG ASR,
     D2 PUSH, D1 PUSH, D0 PUSH, ;

 CODE FIX.UP
      FIX.UP,
      NEXT END-CODE

 CODE FIX.DOWN
      FIX.DOWN,
      NEXT END-CODE


CODE  DIV.VECTOR                    ( x y z , scale --- ' x ' y ' z )
 SAVE.REGS
 D1 POP, D2 POP, D3 POP, D4 POP,
       D1 D2 L.DIV,
       D1 D3 L.DIV,
       D1 D4 L.DIV,
    D4 PUSH, D3 PUSH, D2 PUSH,
  RESTORE.REGS
    NEXT END-CODE


( ADD.VECTORS )                                         ( 081686 YH )

CODE ADD.VECTORS          ( x y z , x y z  --- ' x ' y ' z )
    SAVE.REGS
    D0 POP, D1 POP, D2 POP,
    D3 POP, D4 POP, D5 POP,
    D0  D3 LONG ADD,
    D1  D4 LONG ADD,
    D2  D5 LONG ADD,
    D5 PUSH, D4 PUSH, D3 PUSH,
    RESTORE.REGS  NEXT END-CODE


 CODE MULT.VECTOR         ( x y z , n -- 'x 'y 'z )
  SAVE.REGS
    D4 POP,  D1 POP,
    D2 POP, D3 POP,
    D4 D1 FIX.MUL,
    D4 D2 FIX.MUL,
    D4 D3 FIX.MUL,
    D3 PUSH, D2 PUSH, D1 PUSH,
 RESTORE.REGS
  NEXT END-CODE
```

```
( SCALE.VECTOR  UN.SCALE.VECTOR )                    ( 070486 YH )

 : SCALE.VECTOR, ASSEMBLER   ( SCALES VECTOR )
   SAVE.REGS
     D4 POP, D1 POP, D2 POP, D3 POP,
   D4 D1 FIX.SCALE,
   D4 D2 FIX.SCALE,
   D4 D3 FIX.SCALE,
     D3 PUSH,
   D2 PUSH,
     D1 PUSH,
   RESTORE.REGS ;


 :  UN.SCALE.VECTOR,  ASSEMBLER    ( UNSCALES VECTOR )
   SAVE.REGS
   D4 POP, D1 POP, D2 POP, D3 POP,
   D4 D1 FIX.UNSCALE,
   D4 D2 FIX.UNSCALE,
   D4 D3 FIX.UNSCALE,
     D3 PUSH,
   D2 PUSH,
     D1 PUSH,
   RESTORE.REGS ;


( ADD.3POS SUB.3POS  )                               ( 070386 YH )

 :  ADD.3POS,     ASSEMBLER
       D0 POP, D1 POP, D2 POP,
       D0  SP () LONG ADD,
       D1  2 SP@, LONG ADD,
       D2  3 SP@, LONG ADD, ;


 : SUB.3POS,    ASSEMBLER
       D0 POP, D1 POP, D2 POP,
       D0  SP ()  LONG SUB,
       D1  2 SP@,  LONG SUB,
       D2 3 SP@, LONG SUB, ;


 ( VECTOR UTILS )


    CODE SCALE.VECTOR
         SAVE.REGS
         SCALE.VECTOR,
         RESTORE.REGS
         NEXT END-CODE

     CODE UN.SCALE.VECTOR
         SAVE.REGS
         UN.SCALE.VECTOR,
         RESTORE.REGS
         NEXT END-CODE

    CODE ADD.3POS
     ADD.3POS,
```

```
NEXT END-CODE

CODE SUB.3POS
SUB.3POS,
NEXT END-CODE


 : YAW   dup cos   YAW.COS   COS!
             sin   YAW.SIN   COS! ;
 : PITCH dup cos   PITCH.COS COS!
             sin   PITCH.SIN COS! ;
 : ROL   dup cos   ROLL.COS  COS!
             sin   ROLL.SIN  COS! ;

( ROTAT )                                        ( 092786 YH )

\ ALLOCATE REGS

  : TEMP.SIN ASSEMBLER D6 ;
  : TEMP.COS ASSEMBLER D5 ;
  : TEMP.X   ASSEMBLER D1 ;
  : TEMP.Y   ASSEMBLER D2 ;
  : TEMP1    ASSEMBLER D3 ;
  : TEMP2    ASSEMBLER D4 ;

HEX

: ROTAT  ASSEMBLER                   \ TEMP.COS = cos  TEMP.SIN - sin  , X Y  -- 'X 'Y
   TEMP.Y POP, TEMP.X  POP,
     TEMP.Y TEMP2 LONG MOVE,
     TEMP.X  TEMP1 LONG MOVE,
    TEMP.COS TEMP.X  FIX.RATIO,            \ X * COS
    TEMP.SIN TEMP1   FIX.RATIO,          \ X * SIN
    TEMP.COS TEMP2   FIX.RATIO,          \ Y * COS
    TEMP.SIN TEMP.Y  FIX.RATIO,          \ Y * SIN
  TEMP.Y  TEMP.X  LONG SUB,          \ X - TEMP.X  - TEMP.Y
  TEMP1   TEMP2   LONG ADD,          \ Y = TEMP1 + TEMP2
  TEMP.X PUSH, TEMP2 PUSH,   ;

DECIMAL

HEX
 : UP.VEC, ASSEMBLER
  D0 POP,
  D1 POP,
  D2 POP,
  D0 SWAP, 7FFF # D0 WORD MOVE,
  D1 SWAP, 7FFF # D1 WORD MOVE,
  D2 SWAP, 7FFF # D2 WORD MOVE,
  D2 PUSH,
  D1 PUSH,
  D0 PUSH, ;


 : DOWN.VEC, ASSEMBLER
  D0 POP,
  D1 POP,
  D2 POP,
  D0 LONG TST, MI IF,
    D0 -8000 LONG ADDI,
  ELSE,
```

```
  D0  8000 LONG ADDI,
THEN,
D1 LONG TST, MI IF,
  D1 -8000 LONG ADDI,
ELSE,
  D1  8000 LONG ADDI,
THEN,
D2 LONG TST, MI IF,
  D2 -8000 LONG ADDI,
ELSE,
  D2  8000 LONG ADDI,
THEN,
D0 SWAP, D0 LONG EXT,
D1 SWAP, D1 LONG EXT,
D2 SWAP, D2 LONG EXT,
D2 PUSH,
D1 PUSH,
D0 PUSH, ;

DECIMAL


( SWIVEL, X Y Z / 'X 'Y 'Z )                          ( 092'86 [illegible] )


: (SWIVEL),  ASSEMBLER ( X Y Z -- 'X 'Y 'Z )
  SAVE.REGS
  ROT, ROT,
  ROLL.COS A0  )#move,  A0 () TEMP.COS COS.ASIZE MOVE,
  ROLL.SIN A1  )#move,  A1 () TEMP.SIN COS.ASIZE MOVE,
  ROTAT   ( Z X Y )
  ROT,
  PITCH.COS A0 )#move,  A0 () TEMP.COS COS.ASIZE MOVE,
  PITCH.SIN A1 )#move,  A1 () TEMP.SIN COS.ASIZE MOVE,
  ROTAT  ( X Y Z  )
  ROT, NSWAP,
  YAW.COS A0   )#move,  A0 () TEMP.COS COS.ASIZE MOVE,
  YAW.SIN A1   )#move,  A1 () TEMP.SIN COS.ASIZE MOVE,
  ROTAT  ( Y X Z )
  ROT, NSWAP,
  RESTORE.REGS ;

 CODE SWIVEL
  (SWIVEL), NEXT END-CODE

 CODE SWIVEL,
  >R, (SWIVEL), R>, RTS, END-CODE


: (UN.SWIVEL), ASSEMBLER                 ( 'X 'Y 'Z -- X Y Z )
  SAVE.REGS
    ROT, NSWAP,
  YAW.COS A0   )#move,  A0 () TEMP.COS COS.ASIZE MOVE,
  YAW.SIN A1   )#move,  A1 () TEMP.SIN COS.ASIZE MOVE,
  TEMP.SIN LONG NEG,
  ROTAT  ( Y X Z )
  ROT, NSWAP,
    PITCH.COS A0 )#move,  A0 () TEMP.COS COS.ASIZE MOVE,
  PITCH.SIN A1 )#move,  A1 () TEMP.SIN COS.ASIZE MOVE,
  TEMP.SIN LONG NEG,
  ROTAT  ( X Y Z  )
  ROT, ROT,
    ROLL.COS A0  )#move,  A0 () TEMP.COS COS.ASIZE MOVE,
  ROLL.SIN A1  )#move,  A1 () TEMP.SIN COS.ASIZE MOVE,
```

```
TEMP.SIN LONG NEG,
ROTAT   ( Z X Y )
ROT,
RESTORE.REGS ;                     ( X Y Z )

: (CENTER), assembler
  O.CENTER A0 )#MOVE,
  D0 POP,
  D1 POP,
  D2 POP,
  A0 () D0 LONG SUB,
  4 A0 I) D1 LONG SUB,
  8 A0 I) D2 LONG SUB,
  D2 PUSH,
  D1 PUSH,
  D0 PUSH, ;

CODE CENTER.VECTOR
  (CENTER), NEXT END-CODE

 : in
   DISTANCE @  - ;

 : OUT, ASSEMBLER
        DISTANCE OLIT, A0 POPOFF,
         A0 ()  D0 LONG ADD,
        OBJECTY OLIT, A0 POPOFF,
         A0 ()  D1 LONG ADD,
        OBJECTX OLIT, A0 POPOFF,
         A0 ()  D2 LONG ADD, ;

 CODE OUT              \ translates object to world position
  D0 POP, D1 POP, D2 POP,
   OUT,
  D2 PUSH, D1 PUSH, D0 PUSH,
  NEXT END-CODE

 : SHUNT           \ moves object for window display
   SHUNTY @ + swap
   SHUNTX @ - swap ;

 CODE ALIAS.OFFSET
  D0 POP, D1 POP, D2 POP,
  YALIAS.OFFSET A0 )#MOVE,
  A0 () D1 LONG ADD,
  XALIAS.OFFSET A0 )#MOVE,
  A0 () D2 LONG ADD,
  D2 PUSH, D1 PUSH, D0 PUSH,
 NEXT END-CODE
```

```
(SHADE.8)
(ZBUFF)
3.CURSORS
68020 FIX.MATH
ASSEMBLER.UTILS
AVERAGENORMALS
BACKPORTINIT.8
BUFFER.POLY
BYTE Z.CONSTANTS
CHECKENVIRONS
CLEAR.BUFFERS
CodeSegUtils
COLOR PICKER
COLOR.MANAGE
COLOR.POLY
COLOR.POLY.PROCS.SEG
DOTS
ERROR.ALERT
GLUE.POLY.PROC
HEAP.UTILS
INIT.COLOR.POLY
INIT.POLY.TRAPS
NEW.3LIST
OBJECT.DEFINITIONS
OBJECT.PLUCK
OBJECT.UTILITIES
PARTIAL.SHADE.8
POLY.CREATES.8
POLY.DRAW
POLY.DRAW.MAP
POLY.MACROS
POLY.NORMAL.CLIP.6820
POLYHEADER
PORTINITS
QDTRAPS
RESOURCE.RECORDS
SOLID.DRAW
SYSTEM.GLOBALS
TRANS.68020
WINDOW.ARRAY
WORD Z.CONSTANTS
```

```
\ multiple window array for the swivel

cr ." Loading Window Array... "

STRUCTURE  WINDOW.STATE.RECORD
    LONG:   +THE.WINDOW
    LONG:   +BACK.FLAG
    LONG:   +CHANGED.FLAG
    LONG:   +FILE.CHANGED
    LONG:   +THE.PICT
    LONG:   +THE.PALETTE
    LONG:   +THE.MONO.CLUT
    LONG:   +THE.KEY.CLUT
    LONG:   +THE.SCRATCH#
    LONG:   +THE.REF#
  256 BYTES:  +THE.FILE.NAME
  256 BYTES:  +THE.SCRATCH.NAME
STRUCTURE.END

  \ WINDOW CONSTANTS

  4 CONSTANT #WINDOWS

  CREATE $SCRATCH.NAME  ," 00000000 SwivelScratch"

  SIZE.BOX
  W/COLOR +
  SCROLL.UP/DOWN    +
  SCROLL.LEFT/RIGHT +
  CLOSE.BOX +
  ZOOM.BOX +
  CONSTANT THE.ATTRIBUTES

  CREATE TITLE.STRING ," Swivel © 1988 Y.Harvill"

  CREATE THE.BOUNDS 55 w, 5 w, 345 w, 506 w,

  \ WINDOW ARRAY

  VARIABLE WINDOW.ARRAY #WINDOWS WINDOW.STATE.RECORD * ALLOT


  GLOBAL CURRENT.OUTPUT.WINDOW
  0 TO   CURRENT.OUTPUT.WINDOW

  GLOBAL LAST.OUTPUT.WINDOW
  -1 TO   LAST.OUTPUT.WINDOW

  \ definitions of array variables


  : WORLD.OUTPUT
    WINDOW.ARRAY
    CURRENT.OUTPUT.WINDOW
    WINDOW.STATE.RECORD * +
    +THE.WINDOW )@ ;


  : CURRENT.FILE.NAME
    WINDOW.ARRAY
    CURRENT.OUTPUT.WINDOW
    WINDOW.STATE.RECORD * +
```

```
 +THE.FILE.NAME  ;

: SCRATCH.REF#
  WINDOW.ARRAY
  CURRENT.OUTPUT.WINDOW
  WINDOW.STATE.RECORD * +
  +THE.SCRATCH#  ;

: RES.FILE.REF#
  WINDOW.ARRAY
  CURRENT.OUTPUT.WINDOW
  WINDOW.STATE.RECORD * +
  +THE.REF#  ;

: SCRATCH.NAME
  WINDOW.ARRAY
  CURRENT.OUTPUT.WINDOW
  WINDOW.STATE.RECORD * +
  +THE.SCRATCH.NAME  ;

: CHANGED.FLAG
  WINDOW.ARRAY
  CURRENT.OUTPUT.WINDOW
  WINDOW.STATE.RECORD * +
  +CHANGED.FLAG ;

: BACK.FLAG
  WINDOW.ARRAY
  CURRENT.OUTPUT.WINDOW
  WINDOW.STATE.RECORD * +
  +BACK.FLAG ;

: WINDOW.PICT
  WINDOW.ARRAY
  CURRENT.OUTPUT.WINDOW
  WINDOW.STATE.RECORD * +
  +THE.PICT ;

: FILE.CHANGED
  WINDOW.ARRAY
  CURRENT.OUTPUT.WINDOW
  WINDOW.STATE.RECORD * +
  +FILE.CHANGED ;


: SWIV.PALETTE
  WINDOW.ARRAY
  CURRENT.OUTPUT.WINDOW
  WINDOW.STATE.RECORD * +
  +THE.PALETTE ;

: SWIV.COLORS
  WINDOW.ARRAY
  CURRENT.OUTPUT.WINDOW
  WINDOW.STATE.RECORD * +
  MONOCHROME? IF
    +THE.MONO.CLUT
  ELSE
    +THE.KEY.CLUT
  THEN ;


: SET.SCRATCH.NAME
  CURRENT.OUTPUT.WINDOW
```

```
  TICKCOUNT + $SCRATCH.NAME 1+ AUTO.NUMBER!
  $SCRATCH.NAME DUP C@ 1+ SCRATCH.NAME SWAP CMOVE ;

: INIT.WINDOW.ARRAY
  PAD GETVOL EXT
  LOCALS| C.VOL |
  #WINDOWS 0 DO
    I TO CURRENT.OUTPUT.WINDOW
    SET.SCRATCH.NAME
    CURRENT.FILE.NAME 0 +THE.FILE.NAME ERASE
    C.VOL RES.FILE.REF# !
    C.VOL SCRATCH.REF#  !
    0 SWIV.PALETTE !
    -1 TO MONOCHROME?
    0 SWIV.COLORS !
    0 TO MONOCHROME?
    0 SWIV.COLORS !
    0 BACK.GDEVICE !
    -1 BACK.FLAG !
    0 WINDOW.PICT !
  LOOP
  0 TO CURRENT.OUTPUT.WINDOW ;


: NEXT.OUTPUT.WINDOW
  CURRENT.OUTPUT.WINDOW DUP
    0 LOCALS| THE.FLAG THE.WIN C.OUTPUT
  0 TO CURRENT.OUTPUT.WINDOW
  BEGIN
    WORLD.OUTPUT
    ?ACTIVE.WPTR NOT IF
      CURRENT.OUTPUT.WINDOW TO THE.WIN
      -1 TO THE.FLAG
    THEN                    \ TRUE IF NOT ACTIVE
    CURRENT.OUTPUT.WINDOW
    1+ TO CURRENT.OUTPUT.WINDOW
    CURRENT.OUTPUT.WINDOW #WINDOWS =
  UNTIL
  THE.WIN TO CURRENT.OUTPUT.WINDOW THE.FLAG ;


: SET.CURRENT.WINDOW
    CURRENT.OUTPUT.WINDOW
   LOCALS| C.WINDOW |
   #WINDOWS 0 DO
     I TO CURRENT.OUTPUT.WINDOW
     WORLD.OUTPUT ?ACTIVE.WPTR IF
       GET.WINDOW WORLD.OUTPUT = IF
         I TO C.WINDOW
       THEN
     THEN
   LOOP
 C.WINDOW TO CURRENT.OUTPUT.WINDOW  ;



WINDOW.ARRAY

\ WINDOW 1
```

```
NEW.WINDOW VEIW.WIN
TITLE.STRING             VEIW.WIN  W.TITLE
THE.BOUNDS @RECT           VEIW.WIN  W.BOUNDS
THE.ATTRIBUTES           VEIW.WIN  W.ATTRIBUTES

  dup +THE.WINDOW VEIW.WIN SWAP ):

WINDOW.STATE.RECORD +

\ WINDOW 2

NEW.WINDOW VEIW.WIN
TITLE.STRING             VEIW.WIN  W.TITLE
THE.BOUNDS @RECT           VEIW.WIN  W.BOUNDS
THE.ATTRIBUTES           VEIW.WIN  W.ATTRIBUTES
  dup +THE.WINDOW VEIW.WIN SWAP ):

WINDOW.STATE.RECORD +

\ WINDOW 3

NEW.WINDOW VEIW.WIN
TITLE.STRING             VEIW.WIN  W.TITLE
THE.BOUNDS @RECT           VEIW.WIN  W.BOUNDS
THE.ATTRIBUTES           VEIW.WIN  W.ATTRIBUTES
  dup +THE.WINDOW VEIW.WIN SWAP ):

WINDOW.STATE.RECORD +

\ WINDOW 4

NEW.WINDOW VEIW.WIN
TITLE.STRING             VEIW.WIN  W.TITLE
THE.BOUNDS @RECT           VEIW.WIN  W.BOUNDS
THE.ATTRIBUTES           VEIW.WIN  W.ATTRIBUTES
  dup +THE.WINDOW VEIW.WIN SWAP ):

DROP \ done adding windows
```

```
\ zbuffer constants     \ set to byte length zbuffer and object buffer

    4   CONSTANT Z.RECORD        \ record length in bytes
    2   CONSTANT Z.SHIFT       \ shift mult for record size
    16    CONSTANT Z.REC.SHIFT    \ # of bits in half record
    4096    CONSTANT Z.BOUNDS       \ bounds for cliping
HEX
    FFFF      CONSTANT Z.MASK
      7FFF    CONSTANT ZERASE       \ default fill for zbuff
      7FFF0000  CONSTANT BOTHERASE      \ default fill for long
    10000   CONSTANT ZZ.SIZE.RANGE
DECIMAL

: Z.SIZE, ASSEMBLER  WORD ;          \ assembler length for zbuff
: ZZ.SIZE, ASSEMBLER  LONG ;         \ assembler length for record
: Z.EXT, ASSEMBLER
  LOCALS| R1 R2 |
  R2 R1 LONG EXT,  ;
: Z@ W@ ;
: Z! W@ ;

   1023 CONSTANT LAST.OBJECT
```

```
\ WRITES OUT COSINE TABLE

ANEW COS.TABLES

INCLUDE" FLOATING.POINT"

HEX
  10000 CONSTANT COS.SCALE
DECIMAL

   361 CONSTANT DEGREE.RANGE
  10 CONSTANT DEGREE.SCALE
   4 CONSTANT COS.RECORD

: WRITE.COS
  LOCALS| COS.BUFFER |
  TO.NEAREST
  DEGREE.RANGE DEGREE.SCALE * 0 DO
    I FLOAT DEGREE.SCALE FLOAT F/
    DEGREES FCOS COS.SCALE FLOAT F*
    INT I COS.RECORD * COS.BUFFER + !
  LOOP ;


  : BUFFER>RESOURCE
  0 LOCALS| COS.HANDLE |
  DEGREE.RANGE DEGREE.SCALE * COS.RECORD *
  FROM.HEAP TO COS.HANDLE
  COS.HANDLE LOCK.HANDLE
  COS.HANDLE @ WRITE.COS
  COS.HANDLE UNLOCK.HANDLE
  COS.HANDLE               \ save in local
  ASCII CSTB               \ handle , type
      130                \ handle type id
      ' 0                \ handle type id name
  ADD.RESOURCE
  UPDATE.RESOURCES
  COS.HANDLE DETACH.RESOURCE
  COS.HANDLE TO.HEAP ;

 \ FORGET COS.TABLES
```

```
\ writes tables for sphere shading

anew -shade.tables-

cr

." loading tables for shere shading "

126 DUP * CONSTANT RAD2

: write.zmap
  locals| the.map |
  256 0 do
    256 0 do
      I 128 - dup * j 128 - dup * -
      sqrt 127  < if
        RAD2
        J 128 -   dup * -
        I 128 -   dup * -
          abs sqrt 127 min -127 max
        128 +
      else
        0
      then
      THE.MAP J 8 SCALE + I + C!
    LOOP
  LOOP ;

: make.zmap
  0 locals| zmap |
  256 dup * from.heap to zmap
  zmap if
    zmap lock.handle
    zmap @ write.zmap
    zmap unlock.handle
    zmap
    ascii ZMAP
    128
    ""
    add.resource
    zmap write.resource
    zmap detach.resource
    zmap to.heap
    update.resources
  else
    true abort" unable to create zmap"
  then ;

make.zmap

: write.rmap                  \ writes the 7th power look-up
   0 locals| last the.map |
  128 0 do
    I 8 *
      dup *
      508 + 1016 /       \ power of 2
      dup *
      508 + 1016 /       \ power of 3
      dup *
      508 + 1016 /       \ power of 4
      dup *
      508 + 1016 /       \ power of 5
      dup *
      508 + 1016 /       \ power of 6
```

```
    dup *
    508 + 1016 /        \ power of 7
    8 /
    127 min the.map I + c!
  LOOP ;


: make.rmap                  \ makes a 6th power look-up
  0 locals| rmap |
  128 from.heap to rmap
  rmap if
    rmap lock.handle
    rmap @ write.rmap
    rmap unlock.handle
    rmap
    ascii RMAP
    128
    ""
    add.resource
    rmap write.resource
    rmap detach.resource
    rmap to.heap
    update.resources
  else
    true abort" unable to create rmap"
  then ;

make.rmap

: write.byte.mult              \ writes the byte multiplicatiopn look-up
  locals| bmlt |
  256 0 do
    256 0 do
      I 128 -
      J 128 - *
      bmlt J 9 SCALE I 2* + + W!
    LOOP
  LOOP ;


: make.bmlt                  \ makes a byte multiplication look-up
  0 locals| bmlt |
  256 dup * 2* from.heap to bmlt
  bmlt if
    bmlt lock.handle
    bmlt @ write.byte.mult
    bmlt unlock.handle
    bmlt
    ascii BMLT
    128
    ""
    add.resource
    bmlt write.resource
    bmlt detach.resource
    bmlt to.heap
    update.resources
  else
    true abort" unable to create bmlt"
  then ;

make.bmlt
```

```
\ BUILDS THETA TAB

VARIABLE THIS.ANGLE
GLOBAL   THETA.TAB

2000 constant ThetaResol

 VARIABLE DIFY  VARIABLE DIFX


  : THETA                        (  sin cos -- almost an angle  )
    2DUP 0 = SWAP  0= AND IF     (  if both are zero, then 0    )
      2DROP 0
    ELSE
      2DUP  DIFY ! DIFX !
      ABS SWAP ABS +             ( x y ax + ay )
      >R DIFY @ ThetaResol R> */     ( dify / (dify + difx) )
      DIFX @ 0 < IF              ( 0 to 90 scale to 1000 )
        ThetaResol 2* SWAP -     ( if negative difx, second quadrant )
      ELSE
        DIFY @ 0 < IF            ( if negative dify, forth quadrant )
          ThetaResol 4* -
        THEN
      THEN
    THEN  ;          ( now 90 is scaled to 1000 )



 : BUILD.TAB                     ( builds look-up for angle from theta )
    3600 0 DO
        I COS I SIN THETA
        2* THETA.TAB + THIS.ANGLE !
        ThetaResol 100 /  0 DO
      J THIS.ANGLE @  W!
          THIS.ANGLE @ 2+ THIS.ANGLE !
        LOOP
  LOOP  ;


: CREATE.THETA.RES
  ThetaResol 8 * ThetaResol 100 / + 4 -
  0 LOCALS| RES.HAND theta.length
  theta.length FROM.HEAP TO RES.HAND
  RES.HAND @ theta.length  erase
  RES.HAND IF
    RES.HAND LOCK.HANDLE
    RES.HAND @ TO THETA.TAB
    BUILD.TAB
    RES.HAND UNLOCK.HANDLE
    RES.HAND            \ save in local
    ASCII CSTB            \ handle , type
     133              \ handle type id
      ' 0               \ handle type id name
    ADD.RESOURCE
    UPDATE.RESOURCES
    RES.HAND DETACH.RESOURCE
    RES.HAND TO.HEAP
  THEN ;
```

```
directory
'12/9/89 Swivel:5/30/90 Swivel Beta:Swivel 1.5.50:Swiv.Inter.8n:'
files -t TEXT
'ABOUT SWIVEL'
alias.stuff
ATT.PANEL
before.turnkey
BOOT.HANDLING.8
'changes for editors'
CHECK.SUM
CurrentFiles.8
CurrentFiles.I
Default.Extensions
DELTA.ATT
DESIGN.PREFS
DIALOG.UTILS
display2screen
display32screen
DOUBLE.ARROW.PANEL
DRAW.ARROWS
Draw.Object.8
DRAWING.SCROLL
EDGE
EDIT.MENU
EFFECTS.PANEL
EFFECTS.RENDER
'EPS FILES'
FILE.MENU
FILE.UTILS
FIND.PANEL
FIXED.MEASURE
GRIDS
HALF.PANEL
HANDLE.CENTERS
INHERIT.PANEL
INTERFACE
'Interface Utils'
'Isaac Files.5'
ISAAC.RENDER.FLAGS
KEY.HANDLE
LIGHT.PANEL
LINK.DRAW
'little floating point'
Material.Edit.1
Material.Panel
Materials1
'NEW PRINTING'
NSHADOW2
O.INTERFACE
O.TOOLS
'OBJECT'∂''S VIEW'
OBJECT.ATTITUDE
OBJECT.DRAWING.SCRAP
OBJECT.INFO
OBJECT.MENU.8
OBJECT.MENU.I
OBJECT.POSITION
OBJECT.SCRAP
OPTION.PANEL
Output.File.Utils
OUTPUT.PANEL
'Overlay Utils'
'Palette Panel'
```

```
Palette.File
PALETTE.OPTIONS
'patch slider'
PATH.CHECK
'Pict Constants'
PICT.UTILS
PIXEL.TRANSFORM
'POLY SIDES'
'POLY SIDES.SMALL'
Postscript.Image
Postscript.Tree.8
QUAD.CROSS
QUAD.SIDE
QUAD.UTILS.1
REFLECTANCE.8
RENDER.MENU
Res.Strings
Ruler.Panel
Save.Envir
Scale.Control
SHADE.MENU
ShadeEdit
ShadePanel
SKIN.TREE
SNAPSHOT.SOLID.8
SNAPSHOT.SOLID.I
SOLIDMODEL
SPHERE.UTILS4
'Swiv Strings '
'Swivel Gdevice Palette'
SWIVIpc
TEXT.PARSE
TOOLBOX.DRAW
TWEEN.PANEL
TWEENING
V.TOOLS
VIEWER
WINDOW.RESET
WORLD.MENU
WORLD.PRINTING
'Write PICS'
'Write ZSYS'
Write.32.Pict
WRITE.DXF.FILE
WRITE.INFO.FILE
WRITE.ISAAC.FILE
WRITE.PAINT
WRITE.PICT
WriteOutput.8
WriteOutput.i
WriteRenderMan
WriteRenderMan1
ZBUFF.PANEL
ZBUFF.PANEL.SMALL
ZOOM.RECTS
```

```
\ OUTPUT PANEL

ANEW -ABOUT.SWIVEL.1-

  128 NEW.DIALOG.RECORD

  1 MAKE.ACTIVE.ITEM  ABOUT.OK
  2 MAKE.ACTIVE.ITEM  ABOUT.HELP
  3 MAKE.PICT.ITEM  ABOUT.SWIV.LOGO
  4 MAKE.PICT.ITEM  ABOUT.COPYRIGHT
  5 MAKE.PICT.ITEM  ABOUT.INFO
  6 MAKE.PICT.ITEM  ABOUT.MEMORY.USED

 NAME.DIALOG.RECORD ABOUT.PANEL

global #objects
128 to #objects

global #polys
1500 to #polys

global #total.mem
global #mem.left

  NEW.WINDOW  PIC.WINDOW
  0 0 400 400 PIC.WINDOW W.BOUNDS

  : INIT.PIC.WINDOW
    get.window
    locals| c.window |
    PIC.WINDOW OPEN.PORT
    PIC.WINDOW 8+ CLIP.RECT
    c.window ?active.wptr if
      c.window  WINDOW
    then ;


  : A.HELP
    LOCALS| C.ITEM HIT.ITEM C.RECORD |
      ;

       FIND 0.HELP ABOUT.HELP !

  : ACTIVE.RECORDS              \ counts active resources in record
  CURRENT.RECORDS @             \ fetch current res.records
  DUP C.TYPE + @              \ get the type
  0 LOCALS| C.COUNT T.TYPE C.RECORDS |  \ define globals
  C.RECORDS C.END + @ 1-          \ end of res.id range
  C.RECORDS C.START + @ 2+        \ beginning of res.id range
  DO
      C.RECORDS I TAB.OF @        \ fetch tab for current res
      IF C.COUNT 1+
       TO C.COUNT              \ if active, count it
    THEN
  LOOP
  C.COUNT ;

  : INIT.INFO
  0 ?HEAP.SIZE TO #TOTAL.MEM ;

  : SET.INFO
  0 LOCALS| C.OBJECT |
  WORLD.OUTPUT ?ACTIVE.WPTR IF
    CURRENT.OBJECT @ TO C.OBJECT
```

```
  ACTIVE.RECORDS TO #OBJECTS
  WORLD.OBJECT SET.CURRENT.OBJECT
  NUMBER.TREE.POLYS
  POLY.COUNT TO #POLYS
  0 ?HEAP.SIZE TO #mem.left
ELSE
  0 TO #OBJECTS
  0 TO #POLYS
  0 ?HEAP.SIZE TO #mem.left
THEN ;

: DRAW.COPYRIGHT
 0 0 LOCALS| C.X C.Y |
 ABOUT.COPYRIGHT @ @ 2+
 @RECT 2DROP
 TO C.X TO C.Y
 ABOUT.COPYRIGHT @ @ 2+
 OPEN.PICTURE ABOUT.COPYRIGHT !
 2 TEXTFONT
 9 TEXTSIZE
 10 TEXTMODE
  C.X 1 + C.Y 14 + (MOVE.TO)
  Version$ count type
  C.X 1 - C.Y 26 + (MOVE.TO)
  Copyright$ count type
  C.X 1 + C.Y 38 + (MOVE.TO)
  Author$ count type
  C.X 1 + C.Y 50 + (MOVE.TO)
  Company$ count type

  CLOSE.PICTURE ;

: DRAW.MEM.USED
 0 0 0 LOCALS| C.X C.Y C.XL |
 ABOUT.MEMORY.USED @ @ 2+
 @RECT
 TO C.XL DROP
 1+ TO C.X 1+ TO  C.Y
 ABOUT.MEMORY.USED @ @ 2+
 OPEN.PICTURE ABOUT.MEMORY.USED !
 2 TEXTFONT
 9 TEXTSIZE
 10 TEXTMODE
 C.X C.Y (MOVE.TO)
 C.XL C.Y (LINE.TO)
 C.XL C.Y 9 + (LINE.TO)
 C.X C.Y 9 + (LINE.TO)
 C.X C.Y (LINE.TO)
 C.X 1+ C.Y 1+ (MOVE.TO)
 1 8 PENSIZE
 #total.mem #MEM.LEFT -
 C.XL C.X -
 #total.mem */
 C.Y 1+ (LINE.TO)
 1 1 PENSIZE
 C.X 1+ C.Y 24 + (MOVE.TO)
 #MEM.LEFT  -10 SCALE .
 0  200 PrintResString        \ ." Kbytes Free of"
 #total.mem   -10 SCALE .
 1  200 PrintResString        \ ." Kbytes"
 CLOSE.PICTURE  ;
```

```
: DRAW.INFO
0 0 LOCALS| C.X C.Y |
 ABOUT.INFO @ @ 2+
 @RECT 2DROP
 TO C.X TO C.Y
 ABOUT.INFO @ @ 2+
 OPEN.PICTURE ABOUT.INFO !
 2 TEXTFONT
 10 TEXTSIZE
 10  TEXTMODE
  C.X 1 + C.Y 14 + (MOVE.TO)
  2  200 PrintResString        \  ." Objects Used: "
  C.X 130 + C.Y 14 + (MOVE.TO)
  #objects .
  C.X 1 + C.Y 26 + (MOVE.TO)
 3  200 PrintResString        \ " Objects Remaining: "
  C.X 130 + C.Y 26 + (MOVE.TO)
  last.object 3 - #objects - .
  C.X 1 + C.Y 38 + (MOVE.TO)
 4  200 PrintResString        \ " Number of Polygons:"
  C.X 130 + C.Y 38 + (MOVE.TO)
  #polys .
  CLOSE.PICTURE  ;


 : DISPOSE.COPYRIGHT
  ABOUT.COPYRIGHT @
  HANDLE.SIZE 0 > IF
    ABOUT.COPYRIGHT @
    DISPOSE.PICTURE
  THEN ;

 : DISPOSE.INFO
  ABOUT.INFO @
  HANDLE.SIZE 0 > IF
    ABOUT.INFO @
    DISPOSE.PICTURE
  THEN ;

  : DISPOSE.MEM.LEFT
  ABOUT.MEMORY.USED @
  HANDLE.SIZE 0 > IF
    ABOUT.MEMORY.USED @
    DISPOSE.PICTURE
  THEN ;


: A.OK
   LOCALS| C.ITEM HIT.ITEM C.RECORD |  ;

   FIND A.OK ABOUT.OK !


: DO.ABOUT.PANEL
  current.object @
  ABOUT.PANEL
    LOCALS| C.DIALOG c.object
    IN.OBJECT.DRAWING @ IF
      (PUT.OBJECT.DRAWING)      \ because dialog doesn't de-activate
    THEN
```

```
SET.INFO
0 LAST.RADIO.ITEM !          \ init radio global
C.DIALOG DIALOG.OF INIT.DIALOG    \ open dialog window , push dialog.ptr ond.stack
C.DIALOG GET.ITEMS           \ Fetch item handles
GET.WINDOW >R
PIC.WINDOW WINDOW
DRAW.COPYRIGHT
DRAW.INFO
  DRAW.MEM.USED
R> WINDOW
C.DIALOG SET.ITEMS           \ set boleans and text
BEGIN
  DO.MODAL.DIALOG          \ handle modal events
    DUP C.DIALOG HANDLE.ITEMS   \ handle item events
1 = UNTIL                  \ until ok
C.DIALOG GET.ITEM.DATA          \ fetch new data to record
  QUIT.DIALOG              \ end of dialog
DISPOSE.COPYRIGHT
  DISPOSE.INFO
DISPOSE.MEM.LEFT
4 TEXTFONT
12 TEXTSIZE
c.object set.current.object
in.object.drawing @ if
  discard.activates
  DISPLAY.QUADS
then ;

FIND DO.ABOUT.PANEL ' HANDLE.ABOUT.TOKEN !

\ set this as handler for the about menu


\ AXE UNUSED WORDS

AXE ABOUT.OK
AXE ABOUT.HELP
AXE ABOUT.SWIV.LOGO
AXE ABOUT.COPYRIGHT
AXE ABOUT.INFO
AXE ABOUT.MEMORY.USED
AXE #objects
AXE #polys
AXE #total.mem
AXE #mem.left
AXE A.HELP
AXE ACTIVE.RECORDS
AXE SET.INFO
AXE DRAW.COPYRIGHT
AXE DRAW.MEM.USED
AXE DRAW.INFO
AXE DISPOSE.COPYRIGHT
AXE DISPOSE.INFO
AXE DISPOSE.MEM.LEFT
AXE A.OK
```

```
CR ." Loading anti-aliasing stuff "

 ANEW --ALIAS.STUFF--

\ shade look-up for key color anti-aliasing


  CREATE SHADE.TAB 256 ALLOT
  CREATE INVERSE.SHADE.TAB 512 ALLOT

  : BUILD.SHADE.TAB
    0 0 LOCALS| THE.MAP THE.CLUT                \ make space for locals
    BACK.GDEVICE @ @ +GDPMAP @  TO THE.MAP       \ find the gdevice pixmap
    THE.MAP @ +PMTABLE @ TO THE.CLUT
    THE.CLUT @ +CTSIZE W@ 1+ 0 DO
      THE.CLUT @ +CTTABLE
      I COLORSPEC * +
      +CSRGBCOLOR @RGB
      + + 3 /
      KEY.COLOR.RES @ 2* 1-
      COLOR.SCALE */
      SHADE.TAB I + C!
    LOOP ;

  : BUILD.INVERSE.SHADE.TAB
    0 0 0 0 LOCALS| THIS.NUM LAST.NUM THE.MAP THE.CLUT    \ make space for locals
    INVERSE.SHADE.TAB 512 ERASE                 \ clear the inverse table
    BACK.GDEVICE @ @ +GDPMAP @  TO THE.MAP          \ find the gdevice pixmap
    THE.MAP @ +PMTABLE @ TO THE.CLUT            \ find the clut
    THE.CLUT @ +CTSIZE W@ 1+ 0 DO               \ for the size of the clut
      THE.CLUT @ +CTTABLE
      I COLORSPEC * +
      +CSRGBCOLOR @RGB                   \ fetch the RGB
      + + 3 /                          \ calc the shade
      KEY.COLOR.RES @ 2* 1-
      COLOR.SCALE */                     \ scale to shade increment
      I   KEY.COLOR.RES @  /                   \ find the offset
        KEY.COLOR.RES @  *
      2* +                          \ now its an index
      INVERSE.SHADE.TAB +                    \ now it an address
      I swap C!                        \ set the lookup
    LOOP
                                 \ fill the gaps in the table
    256 Key.Color.Res @ / 0 DO               \ loop for number of colors
      0 TO LAST.NUM                     \ for zero leading colors
      0  Key.Color.Res @ 2* 1- DO               \ loop for increment
        INVERSE.SHADE.TAB
        J Key.Color.Res @ 2* * +
        I + C@ TO THIS.NUM                 \ get the index value
        THIS.NUM 0= IF                   \ if its zero
          LAST.NUM
          INVERSE.SHADE.TAB
          J Key.Color.Res @ 2* * +
          I +  C!                     \ set it to the last number
          LAST.NUM TO THIS.NUM
        THEN
        THIS.NUM TO LAST.NUM
      -1 +LOOP
    LOOP ;


   : BUILD.SHADE.TABLES
     MONOCHROME? NOT IF
       BUILD.SHADE.TAB
```

```
    BUILD.INVERSE.SHADE.TAB
  THEN ;

CREATE MAP.OFFSET 0 ,
CREATE KEY.INCREMENT.MASK -1 , 0 ,

NEW.WINDOW  C.ALIAS.PORT
CREATE ^ALIAS.BITS 0 ,

: OPEN.ALIAS.CPORT                       \ window -- opens as background color port
  0 GET.WINDOW
  0 0 LOCALS| the.map the.clut LAST.WIN THE.CBITS THE.WIN  |  \ define locals
THE.WIN  OPENCPORT                       \ open the color port
THE.WIN  ^PIX.MAP.OF  TO THE.CBITS              \ cbits = ^Pix.map
DFLTQDPROCS THE.WIN  104 + !               \ set the default graphic procedures
BACK.GDEVICE @ @ +GDPMAP @  TO THE.MAP           \ find the gdevice pixmap
THE.MAP @ +PMTABLE @ TO THE.CLUT
THE.CLUT THE.CBITS @ CTabHandle !               \ Set the clut to the backGDevice
0 0 ZBUFFERY @ ZBUFFERX @
THE.CBITS @ UPBOUNDS !RECT                 \ set the bounds of the pixmap
8 THE.CBITS @ PIXELSIZE W!                 \ set the pixel size
8 THE.CBITS @ CMPSIZE W!
zbufferx @ 7+ 8/ 8*
DUP ROW.BIT +
THE.CBITS @ ROWBYTES W!                   \ store in the pixmap
zbuffery @ *                           \ calc size of memory block
HEAP.VARIABLE                            \ locked block handle , ptr
THE.CBITS @ BASEADDR !                     \ store pointer in pixmap
  ^ALIAS.BITS !                          \ store handle in poly global
LAST.WIN ?ACTIVE.WPTR IF                   \ reset window if active
LAST.WIN (WINDOW)  THEN   ;

: OPEN.ALIAS.BITS
  ^ALIAS.BITS @  0 = NOT  IF
    ^ALIAS.BITS @ UNLOCK.HANDLE
    ^ALIAS.BITS @ TO.HEAP
    0 ^ALIAS.BITS !
  THEN
    C.ALIAS.PORT OPEN.ALIAS.CPORT
  ^ALIAS.BITS @ 0 =  IF
    -108 TO ERROR.FLAG
    DO.ERROR.ALERT
  THEN
  ^ALIAS.BITS @ @ MASK.HANDLE
  ^POLY.BITS @ @ MASK.HANDLE -
  MAP.OFFSET ! ;

: CLOSE.ALIAS.BITS
  C.ALIAS.PORT CLOSE.PORT
   ^ALIAS.BITS @  0 = NOT  IF
   ^ALIAS.BITS @ UNLOCK.HANDLE
   ^ALIAS.BITS @ TO.HEAP
    0 ^ALIAS.BITS !
  THEN
   0 C.ALIAS.PORT !
   0 ^ALIAS.BITS !
```

```
  0 MAP.OFFSET !  ;

VARIABLE TEMP.RGB.1  8 ALLOT
VARIABLE TEMP.RGB.2  8 ALLOT
CREATE ^ALIAS.TAB 0 ,
0 constant   ALIAS.TAB

256 256 * CONSTANT ALIAS.TAB.SIZE

create temp.rgbs  24 allot

CODE DO.MONO.ALIAS.SCAN
 SAVE.REGS
  D0 GET,                    \ fetch y
   D0 -1024 WORD ANDI, EQ IF,        \ if within index
      ^SCAN.ARRAY  A1 )#MOVE,        \ a0 is scan array
  A1 () A0 LONG MOVE,
  SCAN.INDEX  A1 )#MOVE,          \ a1 is scan index
    D0 POP,                   \ d0 is y
  D0 2 # WORD ASL,           \ y * 2
  D0 0 WORD A1 @I) D3 LONG MOVE,     \ fetch index to array
    D3 0 LONG A0 @I) A2 LONG MOVE,     \ a2 = start yscan address
  ZBUFFERX A0 )#MOVE,
  A0 () D7 LONG MOVE,
  MAP.OFFSET A0 )#MOVE,
  A0 () D3 LONG MOVE,
  ' ALIAS.TAB  A0 )#MOVE,
  A0 () A0 LONG MOVE,
  d7 3 long subq,
  BEGIN,
    0 D4 MOVEQ,
    D3 0 LONG A2 @I) D4 BYTE MOVE,     \ fetch the byte from the alias screen
    0 D2 MOVEQ,
    A2 () D2 BYTE MOVE,          \ get the byte from the back port
    D4 D2 LONG ADD,             \ add the two
    D2 1 # LONG ASR,           \ average 1 pass
    D4 D2 LONG ADD,            \ add again
    D2 1 # LONG ASR,           \ average 2 pass
        D2 D3 0 LONG A2 @I) BYTE MOVE,     \ set the byte
    1 # A2 LONG ADDA,           \ increment the address
  D7 LOOP,
 ELSE,   SP 4 LONG ADDQ,
       THEN,               \ else clear stack
 RESTORE.REGS
 NEXT END-CODE

CODE DO.KEY.ALIAS.SCAN
XSAVE.REGS
D0 GET,                \ fetch y
   D0 -1024 WORD ANDI, EQ IF.L,       \ if within index
      ^SCAN.ARRAY  A1 )#MOVE,        \ a0 is scan array
  A1 () A0 LONG MOVE,
  SCAN.INDEX  A1 )#MOVE,          \ a1 is scan index
    D0 POP,                   \ d0 is y
```

```
    D0 2 # WORD ASL,            \ y * 2
    D0 0 WORD A1 @I) D3 LONG MOVE,     \ fetch index to array
      D3 0 LONG A0 @I) A2 LONG MOVE,     \ a2 = start yscan address
    ZBUFFERX A0 )#MOVE,
    A0 () D7 LONG MOVE,
    MAP.OFFSET A0 )#MOVE,
    A0 () D3 LONG MOVE,
    KEY.INCREMENT.MASK A0 )#MOVE,
    A0 () D6 LONG MOVE,
    4 A0 I) D5 LONG MOVE,
    SHADE.TAB A0 )#MOVE,
    INVERSE.SHADE.TAB A4 )#MOVE,
    d7 3 long subq,
    BEGIN,
      0 D4 MOVEQ,
      D3 0 LONG A2 @I) D4 BYTE MOVE,     \ fetch the byte from the alias screen
      0 D2 MOVEQ,
      A2 () D2 BYTE MOVE,           \ get the byte from the back port
      0 D0 MOVEQ,
      0 D1 MOVEQ,
        D4 0 WORD A0 @I) D0 BYTE MOVE,
      D2 0 WORD A0 @I) D1 BYTE MOVE,
      D1 D0 WORD ADD,
      D0  1 # WORD ASR,            \ average 1 pass
      D4 0 WORD A0 @I) D1 BYTE MOVE,
      D1 D0 WORD ADD,
      D0  1 # WORD ASR,            \ average 2 pass
      D5 D4 WORD AND,            \ find the color index
      D4 1 # WORD ASL,
      D0 D4 WORD ADD,
      D4 0 WORD a4 @I) D6 BYTE MOVE,     \ d0 is the actual index
      D6 byte tst,
      EQ IF,
        D5 D2 WORD AND,          \ find the color index
        D2 1 # WORD ASL,
        D0 D2 WORD ADD,
        D2 0 WORD a4 @I) D6 BYTE MOVE,  \ d0 is the actual index
      THEN,
        D6 D3 0 LONG A2 @I) BYTE MOVE,      \ set the byte
    1 # A2 LONG ADDA,              \ increment the address
    D7 LOOP,
  ELSE,   SP 4 LONG ADDQ,
       THEN,                 \ else clear stack
  XRESTORE.REGS
  NEXT END-CODE


  256 CONSTANT ALIAS.CONSTANT
hex

  : set.fix.offset
    locals| y x |
    x ALIAS.CONSTANT * XALIAS.OFFSET !
      y ALIAS.CONSTANT * YALIAS.OFFSET !
    ;

  : RESET.SUB.PIXEL
    ALIAS? OFF
    0 XALIAS.OFFSET !
    0 YALIAS.OFFSET !
    0 MAP.FRACT !
    0 MAP.FRACT 4+ !  ;
decimal
```

```
hex
  : SET.SUB.PIXEL  ( X Y -- 0 - 3 SETS SUB PIXEL FOR ANTI-ALIASING )
      3 MIN 0 MAX SWAP
    3 MIN 0 MAX SWAP
    LOCALS| Y X |
    ALIAS? ON
    y  ALIAS.MASK 4+ !
    X Y set.fix.offset
    X 4 * 7 -  MAP.FRACT 4-  !
    Y 4 * 7 -  MAP.FRACT !   ;
decimal


  : FULL.RENDER
    EXIT.FLAG 0= ERROR.FLAG 0= AND IF
      ?CMD-PERIOD IF
        10 SYSBEEP
        -1 TO EXIT.FLAG
      THEN
      WORLD.OBJECT SET.CURRENT.OBJECT
      (EFFECTS.RENDER)
    THEN ;


  : AVERAGE.PORTS
    ERROR.FLAG 0= EXIT.FLAG 0= AND IF
      SET.WATCH.CURSOR
      MONOCHROME? IF
        ZBUFFERY @ 2-  0 DO
          I DO.MONO.ALIAS.SCAN
        LOOP
      ELSE
        ZBUFFERY @ 2-  0 DO
          I DO.KEY.ALIAS.SCAN
        LOOP
      THEN
      INIT.CURSOR
    THEN ;


  hex

  : SET.KEY.INCREMENT.MASK
    100 Key.Color.Res @ / CASE
    1 OF   FF KEY.INCREMENT.MASK !    ENDOF
    2 OF   7F KEY.INCREMENT.MASK !    ENDOF
    4 OF   3F KEY.INCREMENT.MASK !    ENDOF
    8 OF   1F KEY.INCREMENT.MASK !    ENDOF
      10 OF   F KEY.INCREMENT.MASK !    ENDOF
    20 OF   7 KEY.INCREMENT.MASK !    ENDOF
    ENDCASE
    KEY.INCREMENT.MASK @ -1 XOR
    KEY.INCREMENT.MASK 4- !  ;

  decimal

  : back>alias
    SAVE.CLIP >R          \ save current clipping region
    0 0
    zbuffery @ zbufferx @
    temp.rect !rect
    TEMP.RECT CLIP.RECT       \ set new clipping rect
      BACK.BITS               \ fetch current background bitmap ( or pixmap )
```

```
  C.ALIAS.PORT 2+ @ @
  TEMP.RECT DUP
   0 0          \ use temp rect for destination and source of blit
     COPY.BITS          \ do the blit
  R> RESTORE.CLIP       \ restore the old clipping region
   ;

: ALIAS>BACK
  SAVE.CLIP >R        \ save current clipping region
  0 0
  zbuffery @ zbufferx @
  temp.rect !rect
  TEMP.RECT CLIP.RECT     \ set new clipping rect
  C.ALIAS.PORT  2+ @ @
    BACK.BITS           \ fetch current background bitmap ( or pixmap )
  TEMP.RECT DUP
   0 0          \ use temp rect for destination and source of blit
     COPY.BITS          \ do the blit
  R> RESTORE.CLIP       \ restore the old clipping region
   ;

: DO.ALIAS.RENDER
  SET.KEY.INCREMENT.MASK
  BUILD.SHADE.TABLES
  OPEN.ALIAS.BITS
  ^ALIAS.BITS @ 0= NOT IF
    0 0   SET.SUB.PIXEL
    FULL.RENDER
    BACK>ALIAS
    1 2   SET.SUB.PIXEL
    FULL.RENDER
    AVERAGE.PORTS
    2 1   SET.SUB.PIXEL
    FULL.RENDER
    AVERAGE.PORTS
    3 3   SET.SUB.PIXEL
    FULL.RENDER
    AVERAGE.PORTS
    ALIAS>BACK
  THEN
  CLOSE.ALIAS.BITS
  RESET.SUB.PIXEL  ;


: EFFECTS.RENDER
  EFFECT.BITS @  OPTION.ALIAS.BIT AND IF
    DO.ALIAS.RENDER
  ELSE
    FULL.RENDER
  THEN ;


: DO.EFFECTS.RENDER
  0 TO ERROR.FLAG
  0 TO EXIT.FLAG
  EFFECTS.RENDER
  EFFECT.BITS @  OPTION.SHADOW.BIT AND
  EFFECT.BITS @  OPTION.EDGE.BIT AND NOT AND
  EFFECT.BITS @  OPTION.PROPICT.BIT AND NOT AND IF
    DRAW.WORLD.OBJECT.BUFFER
  THEN
  GET.WINDOW >R
    WORLD.OUTPUT WINDOW
    DISPLAY.WORLD
```

```
  R> (WINDOW)  ;

: DO.EFFECTS.COMMAND
  0 TO ERROR.FLAG
  0 TO EXIT.FLAG
  EFFECTS.RENDER
  EFFECT.BITS @  OPTION.SHADOW.BIT AND
  EFFECT.BITS @  OPTION.EDGE.BIT AND NOT AND
  EFFECT.BITS @  OPTION.PROPICT.BIT AND NOT AND IF
    WORLD.OBJECT TREE.CHANGED + CHANGED.FLAG !
  THEN
  GET.WINDOW >R
    WORLD.OUTPUT WINDOW
    DISPLAY.WORLD
    R> (WINDOW)  ;
```

```
\ ATTITUDE GRID PANEL

cr ." Loading Att Grid Panel..."

ANEW ATT.DIALOG

606 MakeSwapOver DO.ATT.PANEL

StartSwapOver

  5001 NEW.DIALOG.RECORD

  1 MAKE.ACTIVE.ITEM  ATT.OK
  2 MAKE.ACTIVE.ITEM  ATT.CANCEL
  3 MAKE.CHECK.ITEM   ATT.SETALL
  4 MAKE.RADIO.ITEM   ATT.NONE
  5 MAKE.RADIO.ITEM   ATT.4
  6 MAKE.RADIO.ITEM   ATT.5
  7 MAKE.RADIO.ITEM   ATT.6
  8 MAKE.RADIO.ITEM   ATT.10
  9 MAKE.RADIO.ITEM   ATT.12

 NAME.DIALOG.RECORD ATT.PANEL

 1 ATT.SETALL !

 : PUT.ATT.PANEL
  LAST.RADIO.ITEM @  DUP IF         \ if radio item was hit
   CASE
    4 OF  1 ANGLE.SCALE * ATT.GRID PLACE ENDOF
    5 OF  5 ANGLE.SCALE * ATT.GRID PLACE ENDOF
    6 OF 10 ANGLE.SCALE * ATT.GRID PLACE ENDOF
    7 OF 12 ANGLE.SCALE * ATT.GRID PLACE ENDOF
    8 OF 15 ANGLE.SCALE * ATT.GRID PLACE ENDOF
    9 OF 45 ANGLE.SCALE * ATT.GRID PLACE ENDOF
  ENDCASE
  OBJECT.CHANGED
  ELSE DROP THEN  ;

  : GET.ATT.PANEL
  0 LOCALS! ATT.ITEM |
  4 TO ATT.ITEM
  ATT.GRID PLUCK
    CASE
     1 ANGLE.SCALE * OF 4 TO ATT.ITEM ENDOF
     5 ANGLE.SCALE * OF 5 TO ATT.ITEM ENDOF
    10 ANGLE.SCALE * OF 6 TO ATT.ITEM ENDOF
    12 ANGLE.SCALE * OF 7 TO ATT.ITEM ENDOF
    15 ANGLE.SCALE * OF 8 TO ATT.ITEM ENDOF
    45 ANGLE.SCALE * OF 9 TO ATT.ITEM ENDOF
    ENDCASE
  ATT.ITEM ;

  1 ATT.NONE !

  VARIABLE TEMP.ATTGRID

  : SET.ONEATT
    TEMP.ATTGRID @
    ATT.GRID PLACE
    OBJECT.CHANGED ;

  FIND SET.ONEATT CONSTANT ^SET.ONEATT
```

```
: SET.ATTGRID.GLOBAL
  ATT.GRID PLUCK
  TEMP.ATTGRID !
  CURRENT.OBJECT @ >R
  WORLD.OBJECT SET.CURRENT.OBJECT
  OPERATION @ >R
  ^SET.ONEATT OPERATION !
  TRAVERSE.DOWN.TREE
  R> OPERATION !
  R> SET.CURRENT.OBJECT ;


: A.BYE
  LOCALS| C.ITEM HIT.ITEM C.RECORD
    DROP 1   ;

    FIND A.BYE ATT.CANCEL !

: A.SAVE
  LOCALS| C.ITEM HIT.ITEM C.RECORD :
  ATT.PANEL GET.ITEM.DATA
  PUT.ATT.PANEL
  ATT.SETALL @ IF
    SET.ATTGRID.GLOBAL
  THEN ;

  FIND A.SAVE ATT.OK !


: (DO.ATT.PANEL)
   ATT.PANEL
   LOCALS| C.DIALOG |
   0 LAST.RADIO.ITEM !          \ init radio global
   C.DIALOG DIALOG.OF INIT.DIALOG    \ open dialog window , push dialog.ptr ono.stack
   C.DIALOG GET.ITEMS           \ Fetch item handles
   C.DIALOG SET.ITEMS           \ set booleans and text
   GET.ATT.PANEL
   C.DIALOG HANDLE.ITEMS        \ handle item events
   BEGIN
     DO.MODAL.DIALOG          \ handle modal events
       DUP C.DIALOG HANDLE.ITEMS    \ handle item events
   1 = UNTIL               \ until ok
   C.DIALOG GET.ITEM.DATA         \ fetch new data to record
     QUIT.DIALOG              \ end of dialog
    ;


 SetSwapOverToken
 EndSwapOver
```

```
: BEFORE.TURNKEY
Protect.Code0
INIT.CHECKCODE
2 ' FILE.MENO !
ASCII "SWVL CREATOR !
;


BEFORE.TURNKEY
```

```
\ boot handling

ANEW --BOOT.HANDLING--

  0 CONSTANT ^SetupMenus

  : SETUPMENUS        \ sets menus to proper state
    SETUP.FILE.MENU
    SET.WORLD.VIEW
    SET.VIEW.ANGLE.MENU
    SETUP.OBJECT.MENU
    SetupShadeMenu
    Set-upRenderMenu ;

  find SetupMenus ' ^SetupMenus !

   : >SWIV.MENUBAR
   ^SETUPMENUS EXECUTE
   >MENUBAR ;

  : INIT.VIEW.MENUBAR
  TOKEN.FOR >SWIV.MENUBAR
  EVENT.TABLE IN.MENUBAR 2* + W! ;

   : DO.MENUS
     ?turnkey if APPLE.MENU then
     INIT.FILES    FILE.MENU.SELECT
     ?turnkey if  EDIT.MENU then
     INSTALL.WORLD.MENU
     INSTALL.OBJECT.MENU
   INIT.SHADE    SHADE.MENU.SELECT
     INIT.RENDER   RENDER.MENU.SELECT
   Init.View.Menubar
   DRAW.MENU.BAR ;

  : MENUS.OFF
    FILE.MENU.OFF
    EDIT.MENU.OFF
    WORLD.MENU.OFF
    OBJECT.MENU.OFF
    SHADE.MENU.OFF
    RENDER.MENU.OFF
      DRAW.MENU.BAR ;

  FIND MENUS.OFF  ' MENU.OFF.TOKEN !

  : MENUS.ON
    FILE.MENU.ON
    EDIT.MENU.ON
    WORLD.MENU.ON
    OBJECT.MENU.ON
    SHADE.MENU.ON
    RENDER.MENU.ON
    DRAW.MENU.BAR ;
```

```
FIND MENUS.ON  ' MENU.ON.TOKEN !

 : Close.edit.windows
  light.window ?active.wptr if
    LIGHT.WINDOW CLOSE.DIALOG
    DPOP DROP
  then
  TWEENING.WINDOW ?active.wptr if
    TWEENING.WINDOW CLOSE.DIALOG
    DPOP DROP
  then
  Material.WIN ?active.wptr if
    Material.WIN CLOSE.WINDOW
  then  ;

find Close.edit.windows ' ^Close.edit.windows !


 : DO.WINDOWS
  INIT.VIEW.CLOSE
    INIT.TWEEN.PANEL
  INIT.OBJECT.POS.WINDOW
  INIT.OBJECT.ATT.WINDOW
  INIT.PIC.WINDOW ;


( RESTORE.HEAP.OBJECTS )

 0 CONSTANT CONTOUR.FILE

: FGET.DEFAULT.TYPE
  OPEN" CONTOURS" ' CONTOUR.FILE !
  DEFAULT.TYPE TYPE.RECORD 0 CONTOUR.FILE READ.VIRTUAL ;

: FSET.DEFAULT.TYPE
  OPEN" CONTOURS" ' CONTOUR.FILE !
  DEFAULT.TYPE TYPE.RECORD 0 CONTOUR.FILE WRITE.VIRTUAL ;


: SET.DEFAULT.TYPE
 CURRENT.OBJECT @ >R
 META.WORLD SET.CURRENT.OBJECT
 DEFAULT.RECT
 DEFAULT.SQUARE
 PUT.CONTOURS
 R> SET.CURRENT.OBJECT ;


 : PATCH.FIX.GRID              \ converts old fixed record to new
   0 LOCALS| OLD.FIXED
     OBJECT.MEASURE.DIV PLUCK
   DECIMAL.SCALE SWAP /
   OBJECT.MEASURE.DIV PLACE
   0 OBJECT.MEASURE.REF  PLACE
   0 OBJECT.MEASURE.SCALE  PLACE
   DECIMAL.SCALE OBJECT.RULER.UNIT PLACE
   DECIMAL.SCALE OBJECT.SCALE.UNIT PLACE
   OBJECT.CHANGED  ;


 : PATCH.GRID.TREE
   OPERATION @ CURRENT.OBJECT ?
```

```
LOCALS| THE.OBJECT THE.OP
WORLD.OBJECT SET.CURRENT.OBJECT
TOKEN.FOR PATCH.FIX.GRID OPERATION !
TRAVERSE.DOWN.TREE
THE.OP OPERATION !
THE.OBJECT SET.CURRENT.OBJECT ;


\ conversion for new graphic scale

7 CONSTANT OLD.GRAPHIC.SHIFT

: CONVERT.POINT
  GRAPHIC.SHIFT
  OLD.GRAPHIC.SHIFT - SCALE
    SWAP
  GRAPHIC.SHIFT
  OLD.GRAPHIC.SHIFT - SCALE
    SWAP ;

: CONVERT.CCONTOUR            \ DRAW THE CURRENT SECTION
   CCONTOUR @ 0 = NOT IF       \ IF ARRAY HAS ELEMENTS
   4 CURRENT.CPOINT !         \ 4 IS FIRST POINT AFTER INDEX
   CCONTOUR @ 0 DO
   THIS.CPOINT@
   CONVERT.POINT
   THIS.CPOINT!
   INC.CURRENT.CPOINT          \ DRAW THE REST
   4 +LOOP  THEN  ;

: CONVERT.CONTOUR                \ SIDE  -- DRAWS CONTOUR
  LOCALS| THE.SIDE |
   4 CURRENT.POINT !          \ SET TO FIRST POINT
   CONTOUR @ 0 DO             \ ENTER LOOP , CONTOUR # IS NUMBER OF POINTS
      THE.SIDE POINT.TO        \ FETCH POINT FOR THIS SIDE
      CONVERT.POINT
    THE.SIDE POINT.FROM
    INC.CURRENT.POINT         \ INCREMENT CURRENT.POINT
   4 +LOOP   ;


: CONVERT.PATH.OBJECT
  OBJECT.FORM PLUCK PATH.FORM - IF
    GET.OBJECT
    CONVERT.CCONTOUR
    UPSIDE CONVERT.CONTOUR
    DOWNSIDE CONVERT.CONTOUR
    UPTOP CONVERT.CONTOUR
    DOWNTOP CONVERT.CONTOUR
    PUT.OBJECT
    OBJECT.CHANGED
  THEN ;

: CONVERT.PATH.WORLD
  CURRENT.OBJECT @
  OPERATION @
  LOCALS| THE.OP THE.OBJECT
  TOKEN.FOR CONVERT.PATH.OBJECT
  OPERATION !
  WORLD.OBJECT SET.CURRENT.OBJECT
  TRAVERSE.DOWN.TREE
  THE.OBJECT SET.CURRENT.OBJECT
  THE.OP OPERATION ! ;
```

```
: CONVERT.OBJECT.SIZE
  0 0 LOCALS| SIZE.DIFF OLD.SIZE
  ' OBJECT.ATTRIBUTES1 4+ @ EXT
  256 +
  OLD.ATTRIBUTES1.SIZE  -
  TO SIZE.DIFF
  CURRENT.HANDLE HANDLE.SIZE TO OLD.SIZE
  OLD.SIZE SIZE.DIFF +
  RESIZE.RES.RECORD IF
    OBJECT.ATTRIBUTES1 DROP
    DUP SIZE.DIFF +
    OLD.SIZE ' OBJECT.ATTRIBUTES1 @ -
    CMOVE>
    131 OBJECT.VERSION PLACE
  ELSE
    -108 TO ERROR.FLAG
    DISCARD.ACTIVATES
    (CLOSE.WORLD)
    DO.ERROR.ALERT
    MENU.OFF.TOKEN EXECUTE
    ABORT
  THEN  ;


: CONVERT.RECORD.SIZE
  CURRENT.OBJECT @
  OPERATION @
  LOCALS| THE.OP THE.OBJECT |
  TOKEN.FOR CONVERT.OBJECT.SIZE
  OPERATION !
  WORLD.OBJECT SET.CURRENT.OBJECT
  TRAVERSE.DOWN.TREE
  THE.OBJECT SET.CURRENT.OBJECT
  THE.OP OPERATION ! ;


: SCALE.ANGLE.RANGE
  ANGLE.SCALE * SWAP
  ANGLE.SCALE * SWAP ;

: UPDATE.131.OBJECT
  YAW.RANGE PLUCK SCALE.ANGLE.RANGE YAW.RANGE PLACE
  PITCH.RANGE PLUCK SCALE.ANGLE.RANGE PITCH.RANGE PLACE
  ROL.RANGE PLUCK SCALE.ANGLE.RANGE ROL.RANGE PLACE
  KEY.MAX 0 DO
    DEFAULT.FRAME.COUNT
    OBJECT.ATTRIBUTES1 DROP
    I KEY.FRAME.RECORD * +
    KEY.STATE.COUNT W!
  LOOP
  OBJECT.TEXT.FIELD0 DROP
  256 ERASE  ;



: UPDATE.131
  CURRENT.OBJECT @
  OPERATION @
  LOCALS| OP OB |
  WORLD.OBJECT SET.CURRENT.OBJECT
  TOKEN.FOR UPDATE.131.OBJECT OPERATION !
  TRAVERSE.DOWN.TREE
  255 SET.CURRENT.OBJECT         \ set the old scrap object as current
```

```
 OBJECT.STATE PLUCK IF
   DELETE.OBJECT.RECORD        \ If its there, delete it.
 THEN
 OB SET.CURRENT.OBJECT
 OP OPERATION !  ;


\ UPDATE.132.OBJECT is in object scrap, with the scrap updating stuff

: UPDATE.132
  CURRENT.OBJECT @
  OPERATION @
  LOCALS| OP OB |
  WORLD.OBJECT SET.CURRENT.OBJECT
  TOKEN.FOR UPDATE.132.OBJECT OPERATION !
  TRAVERSE.DOWN.TREE
  OB SET.CURRENT.OBJECT
  OP OPERATION !  ;


  : UPDATE.VERSION
    0 TO ERROR.FLAG
    OBJECT.VERSION PLUCK 130 < IF
      CONVERT.RECORD.SIZE
      META.WORLD SET.CURRENT.OBJECT
      CONVERT.OBJECT.SIZE
      131 OBJECT.VERSION PLACE
      OBJECT.CHANGED
      PUT.DEFAULT.TYPE                 \ sets default type to cube
      META.WORLD SET.CURRENT.OBJECT
      PUT.CONTOURS
      OBJECT.CHANGED
      WORLD.OBJECT SET.CURRENT.OBJECT
      PATCH.GRID.TREE
      CONVERT.PATH.WORLD
      UPDATE.131
      ENTER.WORLD.RGB
    THEN
    META.WORLD SET.CURRENT.OBJECT
    OBJECT.VERSION PLUCK 131 < IF
      CONVERT.RECORD.SIZE
      META.WORLD SET.CURRENT.OBJECT
      CONVERT.OBJECT.SIZE
      UPDATE.131
      131 OBJECT.VERSION PLACE
    THEN
    META.WORLD SET.CURRENT.OBJECT
    OBJECT.VERSION PLUCK 132 < IF
      META.WORLD SET.CURRENT.OBJECT
      SCALE.RANGE OBJECT.SCALE PLACE
      SCALE.RANGE OBJECT.RSCALE PLACE
      132 OBJECT.VERSION PLACE
      UPDATE.132
    THEN
    META.WORLD SET.CURRENT.OBJECT
    ERROR.FLAG IF
      (CLOSE.WORLD)
      DO.ERROR.ALERT
      MENU.OFF.TOKEN EXECUTE
      ABORT
    THEN ;


  : UPDATE.WARNING
```

```
  (CLOSE.WORLD)
  0  201 ResString        \ " This version of Swivel cannot open this file. You need an Upgrade " "
  "" "" ""
  401 IssueAlert  drop
    MENU.OFF.TOKEN EXECUTE
  ABORT ;

: TEST.OBJECT
0 LOCALS| THE.FLAG |
CURRENT.HANDLE IF
  CURRENT.HANDLE HANDLE.SIZE 0 > IF
    "SWVL OBJECT.APP pluck = IF
       -1 TO THE.FLAG
    THEN
  THEN
THEN
THE.FLAG ;


: ValidateWorld
  META.WORLD SET.CURRENT.OBJECT
  OBJECT.VERSION PLUCK CURRENT.VERSION < IF
    UPDATE.VERSION
  THEN
  META.WORLD SET.CURRENT.OBJECT
  OBJECT.VERSION PLUCK CURRENT.VERSION > IF
    UPDATE.WARNING
  THEN
  materials.exist @ not if
    0 CURRENT.FILE.NAME C!
    Convert2Materials           \ if no lights or materials during load, convert
  THEN
  SET.DEFAULT.TYPE
  WORLD.OBJECT SET.CURRENT.OBJECT
  OBJECT.RENDER PLUCK
  RENDER.MODE !
  SET.WORLD.VIEW
  INIT.WINDOW.PALETTE ;



: INIT.SCRATCH.FILE
OPEN.SCRATCH.FILE
Get.All.Records
ERROR.FLAG IF
  (CLOSE.WORLD)
  DO.ERROR.ALERT
    MENU.OFF.TOKEN EXECUTE
  ABORT
THEN
WORLD.OBJECT SET.CURRENT.OBJECT
CURRENT.HANDLE 0=
META.WORLD SET.CURRENT.OBJECT
CURRENT.HANDLE 0=  OR IF
  NEW.WORLD
  SET.DEFAULT.TYPE
  PUT.NEW.SCRATCH
  WORLD.OBJECT CHANGED.FLAG !
  CHECKIN.WORLD
  set.direct
  true Materials.Exist !          don't convert if an untitled doc
THEN
WORLD.OBJECT SET.CURRENT.OBJECT
TEST.OBJECT 0=
```

```
META.WORLD SET.CURRENT.OBJECT
TEST.OBJECT 0=  OR IF
  (CLOSE.WORLD)
  -108 to error.flag
  do.error.alert
    MENU.OFF.TOKEN EXECUTE
  ABORT
THEN
VALIDATEWORLD
;


: ?CLOSE.LAST.WINDOW                \ closes last window
 CURRENT.OUTPUT.WINDOW
 LOCALS| C.WINDOW :                 \ save this window as local
 LAST.OUTPUT.WINDOW -1 > IF            \ if last exists...
   LAST.OUTPUT.WINDOW TO CURRENT.OUTPUT.WINDOW   \ set as current
   WORLD.OUTPUT  ?ACTIVE.WPTR IF          \ if it is a real window...
     GET.WINDOW >R                 \ fetch the current window
     WORLD.OUTPUT WINDOW             \ set last window as current
     REFRESH.VIEW                 \ refresh the view
     R> (WINDOW)                  \ set window back
     ^REFRESH.VIEW  WORLD.OUTPUT +ON.UPDATE W! \ set update token
     TEMP.CLOSE.SCRATCH.FILE           \ close the file
     MAKE.WINDOW.PICT
     TRUE BACK.FLAG !
   THEN
   -1 TO LAST.OUTPUT.WINDOW            \ set as closed
 THEN
 C.WINDOW TO CURRENT.OUTPUT.WINDOW ;

 FIND ?CLOSE.LAST.WINDOW ' ^?CLOSE.LAST.WINDOW !



: HANDLE.SCRATCH.FILES
   0 TO ERROR.FLAG
   CURRENT.OUTPUT.WINDOW
   LOCALS| C.WINDOW :
   LAST.OUTPUT.WINDOW C.WINDOW = NOT IF
     ?CLOSE.LAST.WINDOW
     C.WINDOW TO CURRENT.OUTPUT.WINDOW
     INIT.SCRATCH.FILE
     WORLD.OBJECT TREE.CHANGED + CHANGED.FLAG !
     RESET.UNDO
     0 IN.OBJECT.DRAWING !
     C.WINDOW TO LAST.OUTPUT.WINDOW
     FLUSH.EVENTS
   THEN
   RES.FILE.ID @ 0 > if
     RES.FILE.ID @ USE.RES.FILE           \ guards against DA's setting other res first
   THEN   ;


  FIND HANDLE.SCRATCH.FILES SCRATCH.TOKEN !


 : RESTORE.HEAP.OBJECTS
    8 OUTPUT.DEPTH !
    SET.START.BACKPORTS   \ init the background buffers
    SET.OBJECT.LIST
      CLEAR.OBJECTS
      ;
```

```
( INIT.SOLIDMODEL )                                    ( 113086 YH )

  : INIT.SOLIDMODEL
    -1 TO LAST.OUTPUT.WINDOW
      REDRAW.LIST1  REDRAW@ !
      0 YAW  0 PITCH  0 ROL
      WHITE BACK.PAT !
     ZBUFFERX @ 2/ XOFFSET !
     ZBUFFERY @ 2/ YOFFSET !
     INIT.SCREEN
       0 DISTANCE !
       0 DRAW.CHECK !
       SET.WIRE.MAX
       \ WORLD.OBJECT SET.CURRENT.OBJECT
       ^NULL.UNDO  UNDO.TOKEN !  ;

( DO.MENUS SOLID.START )                               ( 102586 YH )

  new.window poodle

 : RECOVER.CURRENT.WINDOW
    POODLE SELECT.WINDOW
    POODLE (WINDOW) ;

 GLOBAL OLD.ABORT
 GLOBAL OLD.ERROR

  : SWIV.ERROR.ALERT   ( addr\count -- )
    ?TURNKEY IF
      >ERR.MSG
      ERR.MSG C@ IF
        ERR.MSG  "" "" ""
        401 ISSUEALERT DROP
      THEN
      RECOVER.CURRENT.WINDOW
      RP! SP!
      EVENT.LOOP
    ELSE
      OLD.ERROR EXECUTE
    THEN  ;

  : SWIVEL.ABORT.ALERT   ( addr\count -- )
    ?TURNKEY IF
      ERR.MSG C@ IF
        ERR.MSG  "" "" ""
        401 ISSUEALERT DROP
      THEN
      RECOVER.CURRENT.WINDOW
        RP! SP!
      EVENT.LOOP
    ELSE
      OLD.ABORT EXECUTE
    THEN
    ;
```

```
\ prints a file from the desktop

  : DO.DESK.PRINT
  0 LOCALS| GET.ID |
  NEXT.OUTPUT.WINDOW IF                          \ if there is a window
    CLEAR.SCRATCH.FILE
    REPLY 6+ W@ EXT DUP VOLREF# !
    RES.FILE.REF# !
    REPLY 10+ DUP C@ 1+
    CURRENT.FILE.NAME SWAP CMOVE
      CURRENT.FILE.NAME C@ 0 = NOT IF          \ if not a nil file name
        0 RES.FILE.REF# @ SETVOL              \ set the volume to the file name
      CURRENT.FILE.NAME                      \ open the file
      OPEN.RES.FILE  TO GET.ID                 \ store id in get.id
      POST.RES.ERROR?
      TRUE MATERIALS.EXIST !
      GET.ID -1 = NOT IF                     \ if no error...
        Get.All.Records                     \ load the records
        ERROR.FLAG IF
          DO.ERROR.ALERT                    \ post the error
          GET.ID CLOSE.RES.FILE                \ if error during load..
          Delete.All.Records
        ELSE
          GET.ID CLOSE.RES.FILE              \ detach the records and close the file
          OPEN.SCRATCH.FILE                 \ open new scratch file
          Put.All.Records
          NEW.WINDOW.TOKEN @ EXECUTE
          SET.OUTPUT.TITLE
          VALIDATEWORLD                     make sure its a current file
          SET.VIEW.LIMITS                   \ set poly drawing and line drawing
          ZBUFFER.EXISTS?
            0 ?HEAP.SIZE MINHEAPS.ZB <
            OR IF
            SET.START.BACKPORTS
          THEN
          WORLD.OBJECT
          SET.CURRENT.OBJECT                 \ set the world as current
          REDRAW.OBJECT                     \ draw the world
          DISPLAY.WORLD                     \ display the world
          HILITE.V.TOOL                    \ display the tools
          Do.Print.Job                     \ do the print
          (CLOSE.WORLD)                    \ close this window
        THEN
      THEN
    THEN
  THEN  ;

\ opens a file from the desktop

  : DO.DESK.OPEN
  0 LOCALS| GET.ID
  NEXT.OUTPUT.WINDOW IF                          \ if there is a window
    CLEAR.SCRATCH.FILE
    REPLY 6+ W@ EXT DUP VOLREF# !
    RES.FILE.REF# !
    REPLY 10+ DUP C@ 1+
    CURRENT.FILE.NAME SWAP CMOVE
      CURRENT.FILE.NAME C@ 0 = NOT IF          \ if not a nil file name
        0 RES.FILE.REF# @ SETVOL              \ set the volume to the file name
      CURRENT.FILE.NAME                      \ open the file
      OPEN.RES.FILE  TO GET.ID                 \ store id in get.id
      POST.RES.ERROR?
```

```
    TRUE MATERIALS.EXIST !            \ init materials flag
    GET.ID -1 = NOT IF              \ if no error...
      Get.All.Records             \ load the records
      ERROR.FLAG IF
        DO.ERROR.ALERT            \ post the error
        GET.ID CLOSE.RES.FILE         \ if error during load..
        Delete.All.Records          \ leave
      ELSE
        GET.ID CLOSE.RES.FILE          \ detach the records and close the file
        OPEN.SCRATCH.FILE           \ open new scratch file
        Put.All.Records
        TEMP.CLOSE.SCRATCH.FILE       \ temporary file close
        CHECKIN.WORLD            \ check in the world
        -1 TO LAST.OUTPUT.WINDOW       \ set window as new
        NEW.WINDOW.TOKEN @ EXECUTE       \ open the window
        SET.OUTPUT.TITLE
        HILITE.V.TOOL
      THEN
    THEN
  THEN
THEN  ;


: DO.DESK.COMMAND
 0 0 LOCALS| TEXT.HANDLE  FILE.ID
    REPLY 6+ <W@ VOLREF# !          \ set one.shots
    IODIR OFF
  REPLY 10+ OPENS TO FILE.ID        \ open the file
  POST.FILE.ERROR?
  FILE.ID IF                \ if a good file...
    FILE.ID FILESIZE?
    FROM.MIN.HEAP TO TEXT.HANDLE    \ allocate a handle the size of the file
    TEXT.HANDLE IF              \ if a good handle ...
      TEXT.HANDLE LOCK.HANDLE      \ lock it
      TEXT.HANDLE @           \ address
      FILE.ID FILESIZE?         \ size
      0 FILE.ID            \ offset and id
      READ.VIRTUAL          \ read to memory
      FILE.ID CLOSE           \ close the file
      POST.FILE.ERROR?        \ post error if needed
      ERROR.FLAG 0 = IF         \ if no error
        TEXT.HANDLE         \ parse the text
        PARSE.TEXT.HANDLE
      THEN
      TEXT.HANDLE UNLOCK.HANDLE      \ unlock the handle
      TEXT.HANDLE TO.HEAP        \ dispose of the handle
      ELSE -108 TO ERROR.FLAG        \ if bad handle post error
       DO.ERROR.ALERT
     THEN
   THEN ;


\ The following word opens or prints files that have been either
\ double-clicked or selected and opened from the desktop


: SMDL.FILES ( -- | OPENS SELECTED APPL FILES IN THE EDITOR )
  0 LOCALS| THE.FILE |
  EVENTS ON
  FLUSH.EVENTS
  KEY.STROKE OFF
  COUNTAPPFILES ?DUP              \ any appl files double-clicked?
  IF  1+ 1                  \ for all such files
```

```
DO  REPLY 2+
  I GETAPPFILE TO THE.FILE          \ ( -- file type or 0)
  THE.FILE ASCII SMDL =           \ swivel files ...
  THE.FILE ASCII SMDS = OR          \  swivel scratch files
  IF  REPLY 2+ W@ REPLY 6- W!
    APPFILEMSG 0=            \ should we open or print?
    IF   DO.DESK.OPEN          \ open without drawing
    ELSE DO.DESK.PRINT
    THEN
  ELSE                    \ if another file...
  THE.FILE ASCII TEXT =          \ if a text file...
  IF  REPLY 2+ W@ REPLY 6+ W!
    APPFILEMSG 0= IF          \ should we open or print?
      DO.DESK.COMMAND
    THEN
  THEN
  I 1 =  IF                \ and number 0
    CHECK.NEW.WORLD            \ get a new world
  THEN
  THEN
  I CLRAPPFILF              \ actually clears filetype [illegible]
LOOP
APPFILEMSG 0= NOT IF
  RELEASE.PRINT.RECORD
  RELEASE.D.TITLE             \ release the handle for print dialog
  SCRAPSAFE?
  DISPOSE.HEAP
  BYE
THEN                      \ optional to force bye after finder print
ELSE
  CHECK.NEW.WORLD                \ present an untitled window
THEN   ;


 : SOLID.START
 0 TO ERROR.FLAG
 0 ERR.MSG C!
   DO.WINDOWS
 INIT.WINDOW.ARRAY
   DO.MENUS
 MENU.OFF.TOKEN  EXECUTE
 INIT.INFO
 (ABORT) @ TO OLD.ABORT
 (ERROR) @ TO OLD.ERROR
 TOKEN.FOR SWIV.ERROR.ALERT (ERROR) !
 TOKEN.FOR SWIVEL.ABORT.ALERT  (ABORT) !
 INIT.SOLIDMODEL
 Init.Sphere.Tabs
 Init.lights
 Init.Materials
 RESTORE.HEAP.OBJECTS
 do.error.alert
 LOAD.PRINT.RECORD
 RESET.UNDO
   SMDL.FILES
 GINIT
 INIT.CURSOR
 EVENT.LOOP  ;


 ( SNAP.START )                          ( 101386 [illegible] )

: DO.DIAGNOSTICS
?TURNKEY NOT IF
```

```
  4 textfont
  9 textsize
  page 0 10 move.to
  ." Error:" Error.Flag . cr
  ." Stack:" .s  cr
  ." Heap: " 0 ?heap.size . cr
THEN ;

: WINDOW.IDLE
IF
  DO.DIAGNOSTICS
  BEGIN
    DO.EVENTS MOUSE.DOWN = IF
      ?TURNKEY NOT IF
        WORLD.OUTPUT @ ?ACTIVE.WPTR IF
          PAGE CO.
        THEN
      THEN
    THEN
  AGAIN
 ELSE
  0 TO ERROR.FLAG
 THEN  ;


CODE DO.CHECK
 D0 POP,
 D1 POP,
 D0 1 # LONG ROR,
 D1 D0 LONG ADD,
 D0 PUSH,
 NEXT END-CODE

: CHECKSUM
 0 LOCALS| THE.CHECK THE.N THE.ADD |
 THE.N 0 DO
   THE.ADD I +
   C@ THE.CHECK DO.CHECK
   TO THE.CHECK
 LOOP
 THE.CHECK ;

: checksum.resource
 0 locals| the.res |
 get.resource to the.res
 the.res if
   the.res @ the.res handle.size
   checksum
 else 0 then ;

 0 CONSTANT CODE0CHECK
   0 CONSTANT CODE2CHECK


 : INIT.CHECKCODE
 ASCII CODE 0 checksum.resource ' CODE0CHECK !
 ASCII CODE 2 checksum.resource ' CODE2CHECK !
 ;

 : CHECK.CODE
 ASCII CODE 0 checksum.resource CODE0CHECK =
 ASCII CODE 2 checksum.resource CODE2CHECK = AND
   NOT IF
   1  201 ResString        ( " Swivel has been changed or infected by a Virus. "
```

```
  ""
  ""
  "" 401 IssueAlert
  DROP DISCARD.ACTIVATES
  OPTION.DOWN NOT IF
    BYE
  THEN
THEN  ;


: Protect.Resource
get.resource locals, the.res
the.res if
  the.res Get.Res.Attrs
  8 or
  the.res swap Set.Res.Attrs
  the.res changed.resource
then ;

: Protect.Code0
ascii CODE 0 Protect.Resource ;

: BEFORE.TURNKEY
Protect.Code0
INIT.CHECKCODE
2 ' FILE.MENU !
ASCII "SWVL CREATOR !
;


: EVENTSMASK1 \  replacement for EventsMask in Do.Events
  abort.mask or
  key.stroke @
    IF hex# 5180 execute and THEN
  \ active.window @ CurrentWindow @ -                    GMF 3.3/89
  CURRENTWINDOW @ DUP ACTIVE.WINDOW @  - SWAP PWPIR AND   GMF 3.3 89
    IF inactive.window.events and THEN
  front.window 108 - <w@ 0<
    IF da.events or THEN
  mufi.events or ;

TOKEN.FOR EVENTSMASK1 HEX# 535C TOKEN>ADDR 12 - W!


: SNAP.START
MY.DEBUG @ if
  poodle ON.ACTIVATE WINDOW.IDLE
  poodle ON.UPDATE DO.DIAGNOSTICS
  100 100 200 500   poodle W.BOUNDS \ HIDE THE SYS WINDOW
ELSE
  poodle ON.ACTIVATE WINDOW.IDLE
  -1 -1 0  0  poodle W.BOUNDS      \ HIDE THE SYS WINDOW
THEN
" Debug" poodle w.title
poodle ADD.WINDOW
  WATCH SET.CURSOR
  SHOW.CURSOR
?TURNKEY IF
  CHECK.CODE
THEN
TestEnvironment
^InitXEditors execute
```

```
SOLID.START ;
```

```
in interface utils

Create InBackground 0 ,
0 constant ^DoEditorEvents
find drop constant ^DoXEditor
0 constant ^InitXEditorMenu
0 constant ^InitXEditors
Find drop constant ^HandleXEditorMenu
Create XEditExits 0 ,


in viewer


  : DO.WORLD.EDIT
    INIT.FLAG @ IF
      INIT.WORLD.EDIT
    THEN
    inBackGround @ not if
      FLASH.SELECTED
    then
    DO.EVENTS
    ^DoEditorEvents execute              \ handle external editors
    inBackGround @ if
      drop
     else
       HANDLE.KEYS
       DUP IN.SIZE.BOX  = IF SET.WINDOW.LIMITS THEN
       DUP IN.DRAG.BOX  = IF SET.WINDOW.LIMITS THEN
       DUP IN.ZOOM.OUT  = IF SET.WINDOW.LIMITS THEN
       DUP IN.ZOOM.IN   = IF SET.WINDOW.LIMITS THEN
       DUP UPDATE.EVENT = IF CHECK.RES.FILE THEN
      DOUBLE.CLICK IF
        @MOUSE.DN POINT>XY OUTSIDE.BOUNDS NOT IF
          @MOUSE.DN POINT>XY
          SELECT.OBJECT? IF
            Object.Form.Edit pluck 3 < if
                OBJECT.FORM PLUCK CASE
                PATH.FORM OF
                  -1 IN.OBJECT.DRAWING !
                  -1 INIT.FLAG !  ENDOF
                MESH.FORM OF
                  -2 IN.OBJECT.DRAWING !
                  -1 INIT.FLAG !  ENDOF
              ENDCASE
            else
              Object.Form.Edit pluck ^DoXEditor execute     \ launch external editors
            then
          THEN
        THEN
        DO.TOOL.CLICKS
      THEN
      MOUSE.DOWN = IF
        DO.CONTROLS
        DO.V.TOOLS
        SET.V.CURSORS
        @MOUSE.DN POINT>XY OUTSIDE.BOUNDS NOT IF
                WORLD.EDIT.TOOLS
        THEN
        ^SETUP.OBJECT.MENU EXECUTE           \ be sure menus are set for command keys
      THEN
     then ;
```

in object menu

```
: OBJECT.MENU.SELECT
   OBJECT.MENU MENU.SELECTION:
   dup
     CASE
    EditObject  OF
      DO.OBJECT.EDIT.MENU ENDOF
    SkinTree  OF
      SKIN.TREE
      DISPLAY.WORLD  ENDOF
   ObjectPosPanel    OF
      CURRENT.OBJECT @
      WORLD.OBJECT = NOT IF
        OPEN.OBJECT.POS.WINDOW
      THEN  ENDOF
    ObjectAttPanel    OF
      CURRENT.OBJECT @
      WORLD.OBJECT = NOT IF
        OPEN.OBJECT.Att.WINDOW
      THEN  ENDOF
      PosRulers      OF  DO.RULER.PANEL  ENDOF
    AttitudeGrid  OF  DO.ATT.PANEL  ENDOF
    ObjectForm    OF  DO.DESIGN.PANEL ENDOF
    DrawGrid    OF  TOGGLE.2GRID  ENDOF
    PolarGrid     OF  TOGGLE.POLAR  ENDOF
    UseRulers     OF  TOGGLE.RULERS   ENDOF
  ENDCASE
  UseRulers - ^HandleXEditorMenu execute
  0 HILITE.MENU  ;

  : INIT.OBJECT
    0
    26 202 ResString         \ " Object "
    OBJECT.MENU NEW.MENU
      27 202 ResString         \ " Redesign Object.../R;Create Skin Object;-;"
    OBJECT.MENU APPEND.ITEMS
    28 202 ResString         \ " Object Position.../W;Object Attitude... E;-("
    OBJECT.MENU APPEND.ITEMS
    29 202 ResString           " Align Object;Object's View "
    OBJECT.MENU APPEND.ITEMS
    30 202 ResString         \ " -(;Rulers...;Attitude Grid...;Object Form...;- "
    OBJECT.MENU APPEND.ITEMS
    31 202 ResString         \ " Use Draw Grid;Polar Grid;Show Rulers"
    OBJECT.MENU APPEND.ITEMS
    ""
    ^InitXEditorMenu execute
    OBJECT.MENU APPEND.ITEMS
    ;
```

in boot handling

```
  : SNAP.START
  MY.DEBUG @ if
    poodle ON.ACTIVATE WINDOW.IDLE
    poodle ON.UPDATE DO.DIAGNOSTICS
    100 100 200 500   poodle W.BOUNDS \ HIDE THE SYS WINDOW
  ELSE
    poodle ON.ACTIVATE WINDOW.IDLE
    -1 -1 0  0  poodle W.BOUNDS      \ HIDE THE SYS WINDOW
  THEN
  " Debug" poodle w.title
```

```
poodle ADD.WINDOW
  WATCH SET.CURSOR
  SHOW.CURSOR
?TURNKEY IF
  CHECK.CODE
THEN
TestEnvironment
^InitXEditors execute
SOLID.START ;
```

in text parse

```
: HANDLE.PARSE.ERROR
  0 LOCALS| STR.HANDLE |
  PARSE.ERROR.FLAG inbackground @ not and IF
    TEMP.STRING 20 BLANKS
    CURRENT.TEXT.LINE TEMP.STRING #>S!
    "STR PARSE.ERROR.FLAG ABS
    GET.RESOURCE TO STR.HANDLE
    STR.HANDLE IF
      STR.HANDLE LOCK.HANDLE
      STR.HANDLE @
      PARSE.COMMAND
      "   On Line: "
      TEMP.STRING
      401 IssueAlert
      DROP
      0 TO PARSE.ERROR.FLAG
      STR.HANDLE UNLOCK.HANDLE
    THEN
  THEN ;
```

```
\ CHECKSUM METHODS FOR DETERMINING OBJECT CHANGE

cr ." Loading Check Sum "

  CODE CHECK.SUM  ( ADD. COUNT --- N )
   0 D0 MOVEQ,
   D1 POP,
   D1 2 # LONG ASR,
   D1 1 LONG SUBQ,
   A0 POP,
   BEGIN,
       A0 )+ D0 LONG ADD,
     D0 1 # LONG ROL,
   D1 LOOP,
   D0 PUSH,
   NEXT END-CODE

   CODE CHECK.+SUM  ( ADD. COUNT --- N )
   0 D0 MOVEQ,
   D1 POP,
   D1 1 # LONG ASR,
   D1 1 LONG SUBQ,
   A0 POP,
   BEGIN,
     0 D2 MOVEQ,
       A0 )+ D2 WORD MOVE,
     D2  D0 LONG ADD,
   D1 LOOP,
   D0 PUSH,
   NEXT END-CODE


   VARIABLE CURRENT.OBJECT.CHECK
   VARIABLE CURRENT.OBJECT.XCHECK

   VARIABLE CURRENT.WORLD.CHECK
   VARIABLE CURRENT.WORLD.XCHECK


   : CHECK.IN.OBJECT
   OBJECT.STATE PLUCK IF
    OBJECT.RECORD EXT
    CHECK.SUM
    CURRENT.OBJECT.CHECK !
    OBJECT.RECORD EXT
    CHECK.+SUM
    CURRENT.OBJECT.XCHECK !
   THEN  ;

   : CHECK.OUT.OBJECT
   OBJECT.STATE PLUCK IF
    OBJECT.RECORD EXT
    CHECK.SUM
    CURRENT.OBJECT.CHECK @ -
    OBJECT.RECORD EXT
    CHECK.+SUM
    CURRENT.OBJECT.XCHECK @ -
   AND NOT
   THEN ;

   : ADD.OBJECT.CHECK
    CHECK.IN.OBJECT
```

```
  CURRENT.WORLD.CHECK @
    CURRENT.OBJECT.CHECK @ -
  CURRENT.WORLD.CHECK !
  CURRENT.WORLD.XCHECK @
    CURRENT.OBJECT.XCHECK @ +
  CURRENT.WORLD.XCHECK ! ;

FIND ADD.OBJECT.CHECK CONSTANT ^ADD.OBJECT.CHECK


: CHECKIN.WORLD
  0 FILE.CHANGED ! ;

: SET.FILE.CHANGE
  -1 FILE.CHANGED !
  \ 10 SYSBEEP
  ;

FIND SET.FILE.CHANGE ' OBJECT.CHANGE.TOKEN !


: CHECKOUT.WORLD
  FILE.CHANGED @ ;
```

ABOUT SWIVEL
Alias.Stuff
ATT.PANEL
BOOT.HANDLING.8
CHECK.SUM
DELTA.ATT
DESIGN.PREFS
DIALOG.UTILS
Display2Screen
Display32Screen
DOUBLE.ARROW.PANEL
DRAW.ARROWS
DRAW.OBJECT.8
DRAWING.SCROLL
EDGE
EDIT.MENU
EFFECTS.PANEL
Effects.Render
EPS FILES
FILE.MENU
FILE.UTILS
FIND.PANEL
FIXED.MEASURE
GRIDS
HALF.PANEL
HANDLE.CENTERS
INHERIT.PANEL
INTERFACE
Interface Utils
*Isaac Files.5
*ISAAC.RENDER.FLAGS
KEY.HANDLE
LIGHT.PANEL
LINK.DRAW
*little floating point
MATERIAL.EDIT.1
MATERIAL.PANEL
MATERIALS1
NEW PRINTING
NSHADOW2
O.INTERFACE
O.TOOLS
OBJECT's VIEW
OBJECT.ATTITUDE
OBJECT.DRAWING.SCRAP
OBJECT.INFO
*OBJECT.MENU
OBJECT.MENU.8
OBJECT.POSITION
OBJECT.SCRAP
OPTION.PANEL
Output.File.Utils
OUTPUT.PANEL
Overlay Utils
PALETTE PANEL
PALETTE.FILE
PALETTE.OPTIONS
PATH.CHECK
PICT CONSTANTS
PICT.UTILS
PIXEL.TRANSFORM
POLY SIDES
POLY SIDES.SMALL
Postscript.Image

```
Postscript.Tree.8
QUAD.CROSS
QUAD.SIDE
QUAD.UTILS.1
REFLECTANCE.8
RENDER.MENU
Res.Strings
RULER.PANEL
SAVE.ENVIR
Scale.Control
SHADE.MENU
SKIN.TREE
SOLIDMODEL
SPHERE.UTILS4
Swivel GDevice Palette
TEXT.PARSE
TOOLBOX.DRAW
TWEEN.PANEL
Tweening
V.TOOLS
VIEWER
WINDOW.RESET
WORLD.MENU
WORLD.PRINTING
Write Pics
WRITE ZSYS
Write.32.Pict
Write.DXF.FILE
WRITE.INFO.FILE
*WRITE.ISAAC.FILE
WRITE.PAINT
WRITE.PICT
*WriteOutput.1
WriteOutput.8
WriteRenderMan
ZBUFF.PANEL
ZBUFF.PANEL.SMALL
ZOOM.RECTS
```

ABOUT SWIVEL
Alias.Stuff
ATT.PANEL
BOOT.HANDLING.8
CHECK.SUM
DELTA.ATT
DESIGN.PREFS
DIALOG.UTILS
Display2Screen
DOUBLE.ARROW.PANEL
DRAW.ARROWS
DRAW.OBJECT.8
DRAWING.SCROLL
EDGE
EDIT.MENU
EFFECTS.PANEL
Effects.Render
EPS FILES
FILE.MENU
FILE.UTILS
FIND.PANEL
FIXED.MEASURE
GRIDS
HALF.PANEL
HANDLE.CENTERS
INHERIT.PANEL
INTERFACE
Interface Utils
ISAAC.RENDER.FLAGS
KEY.HANDLE
LIGHT.PANEL
LINK.DRAW
MATERIAL.EDIT.1
MATERIAL.PANEL
MATERIALS1
NEW PRINTING
NSHADOW2
O.INTERFACE
O.TOOLS
OBJECT's VIEW
OBJECT.ATTITUDE
OBJECT.DRAWING.SCRAP
OBJECT.INFO
OBJECT.MENU
OBJECT.POSITION
OBJECT.SCRAP
OPTION.PANEL
Output.File.Utils
OUTPUT.PANEL
Overlay Utils
PALETTE PANEL
PALETTE.FILE
PALETTE.OPTIONS
PATH.CHECK
PICT CONSTANTS
PICT.UTILS
PIXEL.TRANSFORM
POLY SIDES
POLY SIDES.SMALL
Postscript.Image
Postscript.Tree.8
QUAD.CROSS
QUAD.SIDE
QUAD.UTILS.1

```
REFLECTANCE.8
RENDER.MENU
Res.Strings
RULER.PANEL
SAVE.ENVIR
Scale.Control
SHADE.MENU
SKIN.TREE
SOLIDMODEL
SPHERE.UTILS4
Swivel GDevice Palette
TEXT.PARSE
TOOLBOX.DRAW
TWEEN.PANEL
Tweening
V.TOOLS
VIEWER
WINDOW.RESET
WORLD.MENU
WORLD.PRINTING
Write Pics
WRITE ZSYS
Write.32.Pict
Write.DXF.FILE
WRITE.INFO.FILE
WRITE.ISAAC.FILE
WRITE.PAINT
WRITE.PICT
WriteOutput
WriteRenderMan
ZBUFF.PANEL
ZBUFF.PANEL.SMALL
ZOOM.RECTS
```

```
\ Default Extensions file

\ (c) Copyright 1987 by Creative Solutions, Inc.
\ All Rights Reserved.

\ Permission is hereby granted to registered MacForth customers to use
\ this source code in their own applications, provided that the author
\ acknowledges Creative Solutions' contribution within the application's
\ documentation, and/or  "credit screen". Distribution or other use of
\ this source code is prohibited.

hex FFFF,FE8F io.events ! decimal   \ hold off activates till done extending


find Expanded not
iftrue

  20,000 minimum.object
   8,000 minimum.vocab

  create Expanded
  cr ." Loading extensions" cr

  include" current directory"

  SetCD" :extensions"
  cdinclude" Kernel Corrections"     \ repair Kernel FIX 3500402
  cdinclude" Axing"         \ axe words not in glossary
    cdinclude" Misc Support"      \ Load Program dev extensions ie. WORDS
  cdinclude" SetWmgrProcs"      \ Override Wmgr Procs
  cdinclude" double.click"
  cdinclude" alerts"
  cdinclude" memorydump"
  cdinclude" +apple menu"   Apple.Menu
  cdinclude" +file menu"
  cdinclude" All Traps"
  cdinclude" +options menu"   Options.Menu
  cdinclude" +edit menu"
  cdinclude" +Tools Menu"   ToolsMenu
  cdinclude" CSI Graphics"
  cdinclude" High-level Files"
  cdinclude" Sound"
  cdinclude" Dialogs"
  cdinclude" Tasking"
  cdinclude" Loop Checking"

 \ cdinclude" Advanced Graphics"   \ optional
 \ cdinclude" Controls"        \ optional
 \ cdinclude" Text Edit"       \ optional
 \ cdinclude" Color"         \ Quickdraw color
 \ cdinclude" Filter Procs"      \ Quickdraw color
 \ cdinclude" Command Line Edit"   \ Try Editor interactive mode
     include" Paper"
     include" Sibley Editor"
 \   include" Delete/Stamp"      \ optional
 ifend


 16,000 minimum.object
  1,000 minimum.vocab

 apple.menu
 file.menu
 edit.menu
```

```
find options.menu
   iftrue  options.menu   ifend


find ToolsMenu iftrue ToolsMenu  ifend

find error.alert iftrue
  token.for error.alert (error) ;
  token.for abort.alert (abort) ;
ifend

find could.alert
   iftrue  400 could.alert  400 center.alert   ifend

find install.se       \ if sibley editor is present, install it
   iftrue   install.se  ifend

find install.cle
   iftrue install.cle ifend


find InstallDSTool    \ install Delete/Stamp tool group if it's compiled
    IFTRUE  InstallDSTool
        " ???" 1+ INITIALS 3 CMOVE    \ set YOUR initials here
    IFEND

find InstallWCMTool   \ install WCM tool group if it's compiled
  IFTRUE    InstallWCMTool
  IFEND

find assembler
     iftrue " ASSEMBLER" GET.VOCAB   ' ASSEMBLER !
     ifend

"  YH" 1+ initials 3 cmove


events on

find edit.files   \ if sibley editor is present, go edit or print files
  IFTRUE    edit.files
  IFEND



event.loop          \ wait for sys.window activate
```

```
\ Finds, sets and displays delta.changes in object cursor
\ absolute delta change from mouse or glove is
\ put in relative object terms and constrained
\ based on the object's link.type
\ 2-10-87 Young Harvill

CR ." Loading Delta Attitude Stuff..."


\  : UN.SCALE.VECTOR
\   LOCALS| S.N Z Y X |
\ X S.N SCALE.RANGE */
\ Y S.N SCALE.RANGE */
\ Z S.N SCALE.RANGE */  ;


   CREATE MOUSE.DOWN@  0 W, 0 W,

  : SET.RMOUSE @MOUSEXY MOUSE.DOWN@ 4 WPLACE ;

  : RMOUSEXY@ MOUSE.DOWN@ 4 WPLUCK
    @MOUSEXY ROT - >R SWAP - R> ;

    CREATE AMOUSE.DOWN@  0 W, 0 W,

  : SET.ARMOUSE @MOUSEXY AMOUSE.DOWN@ 4 WPLACE ;

  : ARMOUSEXY@ AMOUSE.DOWN@ 4 WPLUCK
  @MOUSEXY ROT - >R SWAP - R>  ;

    CREATE SRMOUSE.DOWN@  0 W, 0 W,  CREATE 3SQUARE 5 ,

  : SET.SRMOUSE @MOUSEXY SRMOUSE.DOWN@ 4 WPLACE ;

  : SRMOUSEXY@ SRMOUSE.DOWN@ 4 WPLUCK
    @MOUSEXY ROT - >R SWAP - R> ;

ANEW DELTA.ATT
                                                        ( 120186 YH )
\ absolute delta change variables

 VARIABLE DELTA.SCALE
 VARIABLE DELTA.3POS  12 ALLOT
 VARIABLE DELTA.COS   COS.LENGTH ALLOT
 VARIABLE DELTA.RCOS  COS.LENGTH ALLOT
 VARIABLE DELTA.ROL
 VARIABLE DELTA.PITCH
 VARIABLE DELTA.YAW
 VARIABLE TEMP.DELTA.SCALE
 VARIABLE TEMP.DELTA.3POS 12 ALLOT
 VARIABLE TEMP.DELTA.COS  COS.LENGTH ALLOT
 VARIABLE TEMP.DELTA.ROL
 VARIABLE TEMP.DELTA.PITCH
 VARIABLE TEMP.DELTA.YAW
 VARIABLE LAST.I3POS  12 ALLOT
 VARIABLE THIS.I3POS  12 ALLOT


   : ZERO.DELTA.VARS          \ sets delta vars to zero
     0 DELTA.SCALE !
     0 0 0 DELTA.3POS  12 LPLACE
     ORTHO.COS DELTA.COS COS.LENGTH CMOVE
```

```
  0 DELTA.ROL     W!
  0 DELTA.PITCH  W!
  0 DELTA.YAW     W!
  0 TEMP.DELTA.SCALE !
  0 0 0 TEMP.DELTA.3POS  12 LPLACE
  ORTHO.COS TEMP.DELTA.COS COS.LENGTH CMOVE
  0 TEMP.DELTA.ROL    W!
  0 TEMP.DELTA.PITCH W!
  0 TEMP.DELTA.YAW    W! ;


\ routines to set relative delta shift

: SET.RDELTA.ATTITUDE          \ shifts absolute attitude by delta
  SET.TEST.VEC              \ set test.vector to 0 angles
  CURSOR.^ACOS COSINES COS.LENGTH CMOVE
  TEST.SWIVEL
  DELTA.COS   COSINES COS.LENGTH CMOVE
  TEST.SWIVEL               \ test.vector is new absolute attitude
  CURSOR.^ACOS COSINES COS.LENGTH CMOVE
  TEST.UN.SWIVEL            \ test.vector is objects old absolute attitude
  GET.ATTITUDE              \ find contrained delta attitude
  T.VARS DELTA.RCOS   COS.LENGTH CMOVE \ store in delta relative
  SET.TEST.VEC              \ set test.vec to orthogonal vector
  CURSOR.RCOS COSINES COS.LENGTH CMOVE \ store current rcos in cosines
  TEST.SWIVEL               \ swivel to vector to relative pos
  DELTA.RCOS  COSINES COS.LENGTH CMOVE \ swivel again for delta
  TEST.SWIVEL
  GET.CONSTRAIN.ATTITUDE         \ fetch new relative, constrained, attitude
  T.VARS OBJECT.RCOS MOVE.RECORD      \ store in current relative
  RESTORE.COSINES ;


:  SET.RDELTA.POSITION            \ shifts absolute position by delta
   SAVE.COSINES
   CURSOR.^ACOS COSINES COS.LENGTH CMOVE
   DELTA.3POS   12 LPLUCK
   INTEGER>FIX
   UN.SWIVEL
   CURSOR.^SCALE @
   UN.SCALE.VECTOR
   CURSOR.R3POS 12 LPLUCK
   ADD.3POS
   OBJECT.R3POS PLACE  ;


  : SET.RDELTA.SCALE          \ shifts absolute scale by delta
    DELTA.SCALE   @
    CURSOR.RSCALE @  +
    scale.min MAX  scale.max MIN
    OBJECT.RSCALE PLACE ;


: CONSTRAIN.RELATIVE     \ constrains relative position to link
  LINK.TYPE PLUCK
  DUP X.LOCK
  AND IF  CURSOR.R3POS 8+ @
         OBJECT.R3POS DROP 8+ !
     THEN
  DUP Y.LOCK
  AND IF  CURSOR.R3POS 4+ @
         OBJECT.R3POS DROP 4- !
```

```
    THEN
    Z.LOCK
AND IF CURSOR.R3POS @
      OBJECT.R3POS DROP  !
     THEN ;


: GET.ALITTLE            \ fetch position and attitude to global vars
    OBJECT.A3POS PLUCK
    DISTANCE ! OBJECTY ! OBJECTX !
   OBJECT.ACOS  COSINES SWAP   MOVE.RECORD
 THIS.I3POS LAST.I3POS 12 CMOVE
 THIS.3ANGLE LAST.3ANGLE 12 CMOVE
 OBJECT.SCALE PLUCK
 SC ! ;


CODE @INC  A0 POP, A0 () 3 LONG CMPI,  LT IF,
           A0 () 1 LONG ADDI, THEN,  NEXT END-CODE

2 CONSTANT LCURSOR.TIME

 \ Use.cube determines if wireframe or cube is used

  VARIABLE DRAW.CHECK
  50 CONSTANT WIRE.MAX


 : USE.CUBE?
   -1 CUBE.FLAG !
 OBJECT.FORM PLUCK PATH.FORM = IF
  CONTOUR @  4/
    CCONTOUR @ 4/  *  WIRE.MAX  <
    IF
    THREE.LIST 0 CUBE.FLAG !
    THEN
  THEN  ;



 : SET.WIRE.MAX
   TICKCOUNT
   50 0 DO
   1000 0 DO LOOP
   LOOP
   TICKCOUNT SWAP -
   200 SWAP /
   ' WIRE.MAX ! ;


 : SET-UP.CURSOR
     1  LINK.TIME !
    USE.CUBE?
    ZERO.DELTA.VARS          \ no delta shift at beginning
    SET.RMOUSE              \ relative mouse move - 0 , 0
    OBJECT.RCUBE            \ for cube wireframe
    CUBE.BOUNDS SWAP MOVE.RECORD  ;


: DISPLAY.DELTA.CHANGE     \ calcs and displays new cursor
 LIMIT? OFF
   SET.RDELTA.ATTITUDE
   SET.RDELTA.POSITION
   SET.RDELTA.SCALE
```

```
  CONSTRAIN.RELATIVE       \ constrain position
  GRID.RELATIVE
  SET.ABSOLUTE           \ relative > absolute for less feedback error
OBJECT.A3POS PLUCK
FIX>INTEGER
THIS.I3POS 12 LPLACE
  LAST.I3POS THIS.I3POS 12  \ check for delta change on the absolute end
COMPARE.RECORD
THIS.3ANGLE LAST.3ANGLE 12
COMPARE.RECORD OR
OBJECT.SCALE PLUCK
SC @ = NOT OR
>R
GET.ALITTLE
R> IF
  CUBE.FLAG @  0= IF
    THREE.LIST
  THEN
      HIDE.CURSOR
    TICKCOUNT
    NPOLY.FRAME
    UPDATE.LINK  REDRAW
    RE.TOGGLE    REDRAW
    TICKCOUNT SWAP -
    LCURSOR.TIME  <  IF
        LINK.TIME @INC THEN
    SHOW.CURSOR
 THEN  ;


: DISPLAY.WORLD.CURSOR
   1  LINK.TIME !
  -1 CUBE.FLAG !
  GET.ALITTLE            \ fetch object pos and att to globals
   HIDE.CURSOR
   0 LAST.DRAWN !
  0 RECOUNT@ @ !
   0 LAST.DRAWN !
   REDRAW@ @ REDRAW.LENGTH ERASE
  4 #POLY.POINTS !
  HIDE.CURSOR
  UPDATE.LINK  REDRAW    \ update the links
  RE.TOGGLE    REDRAW
  SHOW.CURSOR  ;
```

```
\ design prefs

  8010 NEW.DIALOG.RECORD

  1 MAKE.ACTIVE.ITEM  DESIGN.OK
  2 MAKE.ACTIVE.ITEM  DESIGN.CANCEL
  3 MAKE.CHECK.ITEM   DESIGN.TRIANGLE
  4 MAKE.CHECK.ITEM   DESIGN.FRONT
  5 MAKE.CHECK.ITEM   DESIGN.BACK
  6 MAKE.CHECK.ITEM   DESIGN.CULL
  7 MAKE.CHECK.ITEM   MIRROR.CROSS.HORIZ
  8 MAKE.CHECK.ITEM   MIRROR.CROSS.VERT
  9 MAKE.CHECK.ITEM   MIRROR.TOP.HORIZ
   10 MAKE.CHECK.ITEM   MIRROR.TOP.VERT
   11 MAKE.CHECK.ITEM   MIRROR.SIDE.VERT

 NAME.DIALOG.RECORD DESIGN.PANEL

: GET.DESIGN.PANEL
  OBJECT.FORM.RENDER PLUCK
  DUP TRIANGLE.MESH.BIT AND IF 1 ELSE 0 THEN DESIGN.TRIANGLE !
  DUP FRONT.CAP.BIT AND IF 1 ELSE 0 THEN DESIGN.FRONT !
  DUP BACK.CAP.BIT AND IF 1 ELSE 0 THEN DESIGN.BACK !
  CULL.BACK.BIT AND IF 1 ELSE 0 THEN DESIGN.CULL !
    0 MIRROR.CROSS.HORIZ !
    0 MIRROR.CROSS.VERT !
    0 MIRROR.TOP.HORIZ !
      0 MIRROR.TOP.VERT !
      0 MIRROR.SIDE.VERT !  ;

: XMIRROR.CCONTOUR           \ mirrors ccontour in x
  4 CURRENT.CPOINT !         \ set increment to start
  CCONTOUR @ 4/ 0 DO         \ loop for number of points in array
  THIS.CPOINT@  SWAP NEG SWAP   \ mirror the point, leave on stack
  INC.CURRENT.CPOINT         \ increment the offset
  LOOP               \ loop till done
  4 CURRENT.CPOINT !         \ set the increment again
  CCONTOUR @ 4/ 0 DO         \ loop for the number of points in array
  THIS.CPOINT!           \ scoop off the stack
  INC.CURRENT.CPOINT         \ increment the offset
  LOOP     ;             \ put the contour in the object

: YMIRROR.CCONTOUR           \ mirrors ccontour in y
  4 CURRENT.CPOINT !         \ set increment to start
  CCONTOUR @ 4/ 0 DO         \ loop for number of points in array
  THIS.CPOINT@   NEG         \ mirror the point, leave on stack
  INC.CURRENT.CPOINT         \ increment the offset
  LOOP               \ loop till done
  4 CURRENT.CPOINT !         \ set the increment again
  CCONTOUR @ 4/ 0 DO         \ loop for the number of points in array
  THIS.CPOINT!           \ scoop off the stack
  INC.CURRENT.CPOINT         \ increment the offset
  LOOP     ;             \ put the contour in the object

: XMIRROR.CONTOUR            \ mirror the contours in x
  4 CURRENT.POINT !
  CONTOUR @ 4/ 0 DO
  UPTOP POINT.TO  SWAP NEG SWAP
```

```
DOWNTOP POINT.TO SWAP NEG SWAP
UPSIDE POINT.TO SWAP NEG SWAP
DOWNSIDE POINT.TO SWAP NEG SWAP
INC.CURRENT.POINT
LOOP
4 CURRENT.POINT !
CONTOUR @ 4/ 0 DO
DOWNSIDE POINT.FROM
UPSIDE POINT.FROM
DOWNTOP POINT.FROM
UPTOP POINT.FROM
INC.CURRENT.POINT
LOOP
OBJECT.R3CENTER PLUCK
NEG
OBJECT.R3CENTER PLACE ;

: MIRROR.TOPCONTOUR         \ mirror top contour in y
  4 CURRENT.POINT !
  CONTOUR @ 4/ 0 DO
  UPTOP POINT.TO  ABS NEG
  DOWNTOP POINT.TO ABS
  UPTOP POINT.FROM
  DOWNTOP POINT.FROM
  INC.CURRENT.POINT
  LOOP
  OBJECT.R3CENTER PLUCK
  >R >R NEG R> R>
  OBJECT.R3CENTER PLACE  ;

: MIRROR.SIDECONTOUR        \ mirror side contour in y
  4 CURRENT.POINT !
  CONTOUR @ 4/ 0 DO
  UPSIDE POINT.TO  ABS neg
  DOWNSIDE POINT.TO ABS
  UPSIDE POINT.FROM
  DOWNSIDE POINT.FROM
  INC.CURRENT.POINT
  LOOP
  OBJECT.R3CENTER PLUCK
   >R NEG R>
  OBJECT.R3CENTER PLACE ;

GLOBAL XFLIP  1 TO XFLIP
GLOBAL YFLIP  1 TO YFLIP
GLOBAL ZFLIP  1 TO ZFLIP

: INSIDE/OUTPOINTS
  0 0 0  ALLPOINTS 8 -
  LOCALS| THE.POINT1 THE.POINT2 TEMP.1 TEMP.2 |
  ALLPOINTS @
  ALLPOINTS 4+ @ *
  3POINT.LENGTH *
  ALLPOINTS 8+ +
  TO THE.POINT2
  ALLPOINTS @ 2/ 0 DO             \ for half of the array....
    THE.POINT2
    ALLPOINTS 4+ @
    3POINT.LENGTH * -
    TO THE.POINT2
    THE.POINT2 TO TEMP.2
```

```
    THE.POINT1 TO TEMP.1
    ALLPOINTS 4+ @ 0 DO
      TEMP.1 @
      TEMP.1 4+ @
      TEMP.1 8+ @
      TEMP.2 @
      TEMP.2 4+ @
      TEMP.2 8+ @
      TEMP.1 8+ !
      TEMP.1 4+ !
      TEMP.1 !
      TEMP.2 8+ !
      TEMP.2 4+ !
      TEMP.2 !
      TEMP.1 12 + TO TEMP.1
      TEMP.2 12 + TO TEMP.2
    LOOP
    THE.POINT1
    ALLPOINTS 4+ @
    3POINT.LENGTH * +
    TO THE.POINT1
  LOOP ;


: MIRROR.ALLPOINTS
  ALLPOINTS 8 + LOCALS| THE.POINTS
  ALLPOINTS @ 0 DO
    ALLPOINTS 4+ @ 0 DO
      THE.POINTS @ ZFLIP * THE.POINTS !
      THE.POINTS 4 + @ YFLIP * THE.POINTS 4 + !
      THE.POINTS 8 + @ XFLIP * THE.POINTS 8 + !
      THE.POINTS 12 + TO THE.POINTS
    LOOP
  LOOP
  1 TO XFLIP
  1 TO YFLIP
  1 TO ZFLIP
  INSIDE/OUTPOINTS ;


: PUT.DESIGN.PANEL
  ITEM.CHANGED.OF DESIGN.TRIANGLE
  ITEM.CHANGED.OF DESIGN.FRONT OR
  ITEM.CHANGED.OF DESIGN.BACK OR
  ITEM.CHANGED.OF DESIGN.CULL OR
  ITEM.CHANGED.OF MIRROR.CROSS.HORIZ OR
  ITEM.CHANGED.OF MIRROR.CROSS.VERT OR
  ITEM.CHANGED.OF MIRROR.TOP.HORIZ OR
  ITEM.CHANGED.OF MIRROR.TOP.VERT OR
  ITEM.CHANGED.OF MIRROR.SIDE.VERT OR
  IF
    "UNDO.FORM SET.UNDOS
    MARK.CHANGE
    0
    DESIGN.TRIANGLE   @ IF TRIANGLE.MESH.BIT OR THEN
    DESIGN.FRONT    @ IF FRONT.CAP.BIT OR THEN
    DESIGN.BACK     @ IF BACK.CAP.BIT OR THEN
    DESIGN.CULL     @ IF CULL.BACK.BIT OR THEN
    OBJECT.FORM.RENDER PLACE
    OBJECT.FORM PLUCK PATH.FORM - IF
      GET.CONTOURS
      MIRROR.CROSS.HORIZ  @ IF XMIRROR.CCONTOUR THEN
      MIRROR.CROSS.VERT   @ IF YMIRROR.CCONTOUR THEN
      MIRROR.TOP.HORIZ  @ IF XMIRROR.CONTOUR THEN
```

```
      MIRROR.TOP.VERT   @ IF MIRROR.TOPCONTOUR THEN
      MIRROR.SIDE.VERT  @ IF MIRROR.SIDECONTOUR THEN
    PUT.CONTOURS
  THEN
  OBJECT.FORM PLUCK MESH.FORM = IF
    GET.MESH
    MIRROR.CROSS.HORIZ  @ IF
      -1 TO XFLIP MIRROR.ALLPOINTS THEN
    MIRROR.CROSS.VERT   @ IF
      -1 TO YFLIP MIRROR.ALLPOINTS THEN
    MIRROR.TOP.HORIZ  @ IF
      -1 TO ZFLIP MIRROR.ALLPOINTS THEN
      MIRROR.TOP.VERT   @ IF
      -1 TO XFLIP MIRROR.ALLPOINTS THEN
      MIRROR.SIDE.VERT  @ IF
      -1 TO YFLIP MIRROR.ALLPOINTS THEN
    PUT.MESH
  THEN
  CURRENT.OBJECT @ TREE.CHANGED · CHANGED.FLAG !
ELSE
  CURRENT.OBJECT CHANGED.FLAG !
THEN  ;


: D.BYE
  LOCALS| C.ITEM HIT.ITEM C.RECORD
    DROP 1   ;

     FIND D.BYE DESIGN.CANCEL !

: DSAVE
  LOCALS| C.ITEM HIT.ITEM C.RECORD
  PUT.DESIGN.PANEL ;

  FIND DSAVE DESIGN.OK !


: DO.DESIGN.PANEL
   CURRENT.OBJECT @
 WORLD.OBJECT = NOT IF
   GET.DESIGN.PANEL
   DESIGN.PANEL HANDLE.DIALOG
 THEN ;


\ AXE UNUSED WORDS

AXE DESIGN.OK
AXE DESIGN.CANCEL
AXE DESIGN.TRIANGLE
AXE DESIGN.FRONT
AXE DESIGN.BACK
AXE DESIGN.CULL
AXE MIRROR.CROSS.HORIZ
AXE MIRROR.CROSS.VERT
AXE MIRROR.TOP.HORIZ
AXE MIRROR.TOP.VERT
AXE MIRROR.SIDE.VERT
AXE GET.DESIGN.PANEL
AXE PUT.DESIGN.PANEL
AXE DSAVE
```

```
\ DIALOG HANDLERS
\ 5.87 Young Harvill
\ These routines interface with standard mac dialogs
\ Once the items in a dialog are designed, declare a
\ dialog.record  and appropriate item.records for the res edit designed
\ dialog. Inputs and outputs from the dialog are managed by these routines.
\ Last Revision: 03/16/88  06:06:48 PM   YH
\ added item.changed flag for detecting which items were used


ANEW DIALOG.HANDLER.II

CR
." Loading Dialog Handlers... "

\ stack for nested dialogs

10 CONSTANT D.STACK.DEPTH     \ change if more than 10 nested dialogs

VARIABLE DIALOG.STACK   D.STACK.DEPTH 4* ALLOT
     DIALOG.STACK   D.STACK.DEPTH 4* ERASE

CREATE D.STACK.PTR  0 ,

: DPUSH              \ dialog handle  -- pushes on dialog stack
      D.STACK.PTR @  4+
    0 MAX D.STACK.DEPTH 4* MIN DUP
    D.STACK.PTR !
      DIALOG.STACK + !
  ;

: DPOP               \ -- pops dialog handle
      D.STACK.PTR @  DUP 4-
    0 MAX D.STACK.DEPTH 4* MIN
    D.STACK.PTR !
      DIALOG.STACK + @  ;

: DGET               \ -- gets top of dialog stack
    D.STACK.PTR @
    DIALOG.STACK + @  ;


\ dialog constants


 1 CONSTANT TEXT.ITEM           \ item user types
 2 CONSTANT ONE.BUTTON
 3 CONSTANT BOOL.BUTTON
 5 CONSTANT ACTIVE.BUTTON
64 CONSTANT PICT.ITEM
 CREATE LAST.RADIO.ITEM 0 ,


 0 CONSTANT ^SET.BOOL       \ tokens for handling specific item types
 0 CONSTANT ^SET.TEXT
 0 constant ^SET.PICT
 0 CONSTANT ^HANDLE.RADIO
 0 CONSTANT ^HANDLE.CHECK
 0 CONSTANT ^GET.BOOL
 0 CONSTANT ^GET.TEXT

 \  offsets for item record
```

```
 0  CONSTANT ITEM#
 4  CONSTANT ITEM.UTYPE
 8  CONSTANT ITEM.SET.TOKEN
12  CONSTANT ITEM.HANDLER.TOKEN
16  CONSTANT ITEM.GET.TOKEN
24  CONSTANT ITEM.HANDLE
28  CONSTANT ITEM.RECT
36  CONSTANT ITEM.BOOL
40  CONSTANT ITEM.TYPE
44  CONSTANT ITEM.CHANGED
48  CONSTANT ITEM.BANK
52  CONSTANT ITEM.STRING
ITEM.STRING 52 +
  CONSTANT ITEM.RECORD


: NUL.HANDLE.ITEM                   \ only handles changes
    LOCALS|  C.ITEM HIT.ITEM C.RECORD
      C.ITEM @ HIT.ITEM = IF
      -1  C.ITEM ITEM.CHANGED + !
    THEN  ;


: NUL.GET.ITEM DROP ;

: NUL.SET.ITEM                  \ just sets changed flag
  LOCALS| C.RECORD  |
  0 C.RECORD ITEM.CHANGED + ! ;         \ set not changed


 FIND NUL.HANDLE.ITEM              \ tokenize nul operations
  CONSTANT ^NUL.HANDLE.ITEM
 FIND NUL.GET.ITEM
  CONSTANT ^NUL.GET.ITEM
 FIND NUL.SET.ITEM
  CONSTANT ^NUL.SET.ITEM


 :  ITEM.CHANGED.OF
    -FIND
    -FOUND
    DROP
    PFA ITEM.CHANGED +
   COMPILING IF
    COMPILE ALIT
    NEXT.PTR  - ,
   THEN ;  IMMEDIATE

 :  ITEM.BANK.OF
    -FIND
    -FOUND
    DROP
    PFA ITEM.BANK +
   COMPILING IF
    COMPILE ALIT
    NEXT.PTR  - ,
   THEN ;  IMMEDIATE


 \ default control for filling new record

   CREATE DEFAULT.CONTROL  ITEM.RECORD ALLOT
```

```
    DEFAULT.CONTROL ITEM.RECORD ERASE
      DEFAULT.CONTROL ITEM.STRING -
      ITEM.RECORD ITEM.STRING - BLANKS

: ITEM.RECORD.OF              \ the.dialog item# --- pointer to record
  LOCALS| ITEM# THE.DIALOG |
  ITEM# 4*
  THE.DIALOG 8+ + ;

\ Item definitions words


\ defining word for a radio item in a dialog

: MAKE.RADIO.ITEM
  0 LOCALS| C.RECORD  ITEM# THE.DIALOG
  ONE.BUTTON ITEM#
  CREATE
  HERE  TO C.RECORD           \ init to start of this record
     ,  ,                  \ item# of control
   ITEM.STRING 8 - ALLOT          \ allot rest of record
     DEFAULT.CONTROL 8 +          \ address of default record
   C.RECORD 8+             \ start of
   ITEM.STRING 8 - CMOVE        \ fill remaining record with defaults
   C.RECORD NEXT.PTR -        \ for relocatable address
  THE.DIALOG DUP @ ITEM.RECORD.OF !   \ store in dialog record
  ^NUL.GET.ITEM    C.RECORD
    ITEM.GET.TOKEN + !        \ set token for fetching dialog value
  ^SET.BOOL      C.RECORD
    ITEM.SET.TOKEN + !        \ set token for setting dialog value
  ^HANDLE.RADIO    C.RECORD
    ITEM.HANDLER.TOKEN + !      \ set token for event handling
  1 THE.DIALOG   +!
  THE.DIALOG
  DOES> ITEM.BOOL +    ;          \ output address of boolean


\ defining word for a check-box item in a dialog

 : MAKE.CHECK.ITEM
  0 LOCALS| C.RECORD  ITEM# THE.DIALOG  |
  BOOL.BUTTON ITEM#
  CREATE
  HERE  TO C.RECORD           \ init to start of this record
     ,  ,                  \ item# of control
   ITEM.STRING 8 - ALLOT          \ allot rest of record
     DEFAULT.CONTROL 8 +          \ address of default record
   C.RECORD 8+             \ start of
   ITEM.STRING 8 - CMOVE        \ fill remaining record with defaults
   C.RECORD NEXT.PTR -        \ for relocatable address
  THE.DIALOG DUP @ ITEM.RECORD.OF !   \ store in dialog record
  ^NUL.GET.ITEM     C.RECORD
    ITEM.GET.TOKEN + !        \ set token for fetching dialog value
  ^SET.BOOL      C.RECORD
    ITEM.SET.TOKEN + !        \ set token for setting dialog value
  ^HANDLE.CHECK    C.RECORD
    ITEM.HANDLER.TOKEN + !      \ set token for event handling
  1 THE.DIALOG   +!
  THE.DIALOG
  DOES> ITEM.BOOL +    ;          \ output address of boolean


 \ defining word for active item in a dialog
```

```
: MAKE.ACTIVE.ITEM
 0 LOCALS| C.RECORD  ITEM# THE.DIALOG
 ACTIVE.BUTTON ITEM#
 CREATE
 HERE  TO C.RECORD          \ init to start of this record
    , ,                    \ item# of control
  ITEM.STRING 8 - ALLOT          \ allot rest of record
    DEFAULT.CONTROL 8 +          \ address of default record
  C.RECORD 8+            \ start of
  ITEM.STRING 8 - CMOVE        \ fill remaining record with defaults
  C.RECORD NEXT.PTR -        \ string is not used
 THE.DIALOG DUP @ ITEM.RECORD.OF !
 ^NUL.GET.ITEM   C.RECORD
   ITEM.GET.TOKEN + !        \ token to retrieve dialog var
 ^NUL.SET.ITEM   C.RECORD
   ITEM.SET.TOKEN + !        \ token to set dialog
 ^NUL.HANDLE.ITEM  C.RECORD
   ITEM.HANDLER.TOKEN + !      \ token to handle event loop
 1 THE.DIALOG  +!
 THE.DIALOG
 DOES> ITEM.HANDLER.TOKEN +    ;   \ output address of token


\ defining word for text items


: MAKE.TEXT.ITEM
  0 LOCALS| C.RECORD  ITEM# THE.DIALOG  |
  TEXT.ITEM ITEM#
  CREATE
  HERE  TO C.RECORD          \ init to start of this record
    , ,                    \ item# of control
   ITEM.RECORD 8 - ALLOT          \ allot rest of record
     DEFAULT.CONTROL 8 +          \ address of default record
   C.RECORD 8+            \ start of
   ITEM.RECORD 8 - CMOVE        \ fill remaining record with defaults
   C.RECORD NEXT.PTR -
  THE.DIALOG DUP @ ITEM.RECORD.OF !
  ^GET.TEXT     C.RECORD
    ITEM.GET.TOKEN + !
  ^SET.TEXT     C.RECORD
    ITEM.SET.TOKEN + !
  ^NUL.HANDLE.ITEM  C.RECORD
    ITEM.HANDLER.TOKEN + !
  1 THE.DIALOG  +!
  THE.DIALOG
  DOES> ITEM.STRING +    ;        \ output address of string

\ defining word for pict item

: MAKE.PICT.ITEM
  0 LOCALS| C.RECORD  ITEM# THE.DIALOG
  PICT.ITEM ITEM#
  CREATE
  HERE  TO C.RECORD          \ init to start of this record
    , ,                    \ item# of control
   ITEM.STRING 8 - ALLOT          \ allot rest of record
     DEFAULT.CONTROL 8 +          \ address of default record
   C.RECORD 8+            \ start of
   ITEM.STRING 8 - CMOVE        \ fill remaining record with defaults
   C.RECORD NEXT.PTR -        \ string is not used
  THE.DIALOG DUP @ ITEM.RECORD.OF !
```

```
^NUL.GET.ITEM   C.RECORD
  ITEM.GET.TOKEN + !        \ token to retrieve dialog var
^SET.PICT   C.RECORD
  ITEM.SET.TOKEN + !        \ token to set dialog
^NUL.HANDLE.ITEM  C.RECORD
  ITEM.HANDLER.TOKEN - !     \ token to handle event loop
1 THE.DIALOG  +!
THE.DIALOG
DOES> ITEM.HANDLE +    ;     \ output address of token


: FLIP  0= IF 1 ELSE 0 THEN ;      \ toggles boolean

  HEX
  A8A4 MT (INVERT.RECT)

DECIMAL

  : FLASH.ITEM
  LOCALS| C.ITEM |
  C.ITEM ITEM.RECT + (INVERT.RECT)
  TICKCOUNT BEGIN DUP
  TICKCOUNT SWAP - 7 = UNTIL DROP
  C.ITEM ITEM.RECT + (INVERT.RECT) ;


: GET.DIALOG.ITEM         \ fetches type, handle, rect to current item
  LOCALS| C.RECORD  |
  DGET
  C.RECORD @
  C.RECORD ITEM.TYPE +
  C.RECORD ITEM.HANDLE +
  C.RECORD ITEM.RECT +
  GET.D.ITEM ;


: GET.ITEM.TEXT            \ fetches text to current item
  LOCALS| C.RECORD  |
  C.RECORD ITEM.STRING +
  DUP
  ITEM.RECORD ITEM.STRING -
  BLANKS              \ clear string in record
  0 SWAP C!             \ set count to zero
  C.RECORD ITEM.HANDLE + @
  PAD
  GET.I.TEXT            \ fetch text to pad
  PAD C.RECORD ITEM.STRING +
  PAD C@ 1+
  ITEM.RECORD ITEM.STRING -  MIN  \ transfer to item.string
  CMOVE ;


FIND GET.ITEM.TEXT ' ^GET.TEXT !  \ set.token


: GET.ITEM.BOOL            \ sets boolean from current item
    LOCALS| C.RECORD  |  ;

  FIND GET.ITEM.BOOL ' ^GET.BOOL !


: SET.DIALOG.ITEM         \ sets type, handle, rect from current item
  LOCALS| C.RECORD  |
  DGET
```

```
  C.RECORD @
  C.RECORD ITEM.TYPE + W@
  C.RECORD ITEM.HANDLE + @
  C.RECORD ITEM.RECT +
  SET.D.ITEM ;

FIND SET.DIALOG.ITEM ' ^SET.PICT !

: SET.ITEM.TEXT            \ sets text from current item
  LOCALS| C.RECORD  |
    C.RECORD ITEM.HANDLE + @
  C.RECORD ITEM.STRING +
  SET.I.TEXT            \ set text string
  C.RECORD ITEM.TYPE + w@ 16 = if
    DGET C.RECORD @
    0 0             \ length of string selection
    SEL.I.TEXT          \ set selection range
  then
  0 C.RECORD ITEM.CHANGED + ! ;   \ set not changed

 FIND SET.ITEM.TEXT  ' ^SET.TEXT !
1 CONSTANT INSIDE.BUTTON

: SET.ITEM.BOOL              \ sets boolean from current item
    LOCALS| C.RECORD  |
      C.RECORD ITEM.BOOL + @
  C.RECORD ITEM.HANDLE + @
      SWAP SET.CONTROL
   0 C.RECORD ITEM.CHANGED + !  ;

FIND SET.ITEM.BOOL ' ^SET.BOOL !

: HANDLE.C.CONTROL            \ handles check.boxes
  LOCALS|  C.ITEM HIT.ITEM C.RECORD
    C.ITEM @ HIT.ITEM = IF
      C.ITEM ITEM.BOOL + @ FLIP
      C.ITEM ITEM.BOOL + !
        C.ITEM ITEM.HANDLE + @
    TOGGLE.CONTROL
    -1  C.ITEM ITEM.CHANGED + !
  THEN  ;

FIND HANDLE.C.CONTROL ' ^HANDLE.CHECK !

: HANDLE.R.CONTROL            \ control.record , item -- handles radio buttons
  LOCALS|  C.ITEM HIT.ITEM :
    C.ITEM @ HIT.ITEM = IF
    C.ITEM @ LAST.RADIO.ITEM !
    C.ITEM ITEM.BOOL + @ 0= IF
          C.ITEM ITEM.HANDLE + @
      TOGGLE.CONTROL THEN
    1 C.ITEM ITEM.BOOL + !
    -1  C.ITEM ITEM.CHANGED + !
  ELSE
        C.ITEM ITEM.BOOL + @  IF
        C.ITEM ITEM.HANDLE + @
    TOGGLE.CONTROL THEN
    0 C.ITEM ITEM.BOOL + !
    -1  C.ITEM ITEM.CHANGED + !
```

```
  THEN  ;

: HANDLE.RADIO
  0 LOCALS|  RADIO.BANK C.ITEM HIT.ITEM C.RECORD |
  C.ITEM ITEM.BANK + @ TO RADIO.BANK
  C.RECORD @ 0 DO
    C.RECORD I ITEM.RECORD.OF @ NEXT.PTR +
      TO C.ITEM
    C.ITEM ITEM.UTYPE + @ ONE.BUTTON =
    C.ITEM ITEM.BANK + @ RADIO.BANK = AND IF
      HIT.ITEM C.ITEM  HANDLE.R.CONTROL
    THEN
    LOOP  ;

FIND HANDLE.RADIO ' ^HANDLE.RADIO !


  : DIALOG.OF  4+ @ ;


  : SET.ITEMS
    LOCALS| C.RECORD |
      C.RECORD @ 0 DO
         C.RECORD I ITEM.RECORD.OF @ NEXT.PTR +
         DUP ITEM.SET.TOKEN + @ EXECUTE
      LOOP ;

 : GET.ITEMS
    LOCALS| C.RECORD |
      C.RECORD @ 0 DO
        C.RECORD I ITEM.RECORD.OF @ NEXT.PTR +
        GET.DIALOG.ITEM
      LOOP ;

 : GET.ITEM.DATA
    LOCALS| C.RECORD |
       C.RECORD @ 0 DO
         C.RECORD I ITEM.RECORD.OF @ NEXT.PTR +
         DUP ITEM.GET.TOKEN + @ EXECUTE
      LOOP ;

 :  HANDLE.ITEMS
    0 LOCALS| C.ITEM C.RECORD HIT.ITEM |
    C.RECORD @ 0 DO
        C.RECORD I ITEM.RECORD.OF @ NEXT.PTR +
      DUP @ HIT.ITEM = IF
        TO C.ITEM ELSE
        DROP      THEN
    LOOP
    C.RECORD HIT.ITEM
    C.ITEM 0 = NOT IF
      C.ITEM DUP ITEM.HANDLER.TOKEN + @ EXECUTE
    THEN  ;


: NEW.DIALOG.RECORD          \ res.id item# -- ITEM.TYPE returns item#  res.id  )
  0 4000 LOCALS| MEM.SIZE N.HANDLE RES.ID |
    MEM.SIZE RSRVMEM  0 = IF
      MEM.SIZE FROM.HEAP TO N.HANDLE
    N.HANDLE LOCK.HANDLE
    N.HANDLE @ 4000 ERASE
    RES.ID N.HANDLE @ 4+ !
    N.HANDLE
```

```
    N.HANDLE @
  ELSE -1 ABORT" Unable to make new dialog record "
  THEN  ;


: NAME.DIALOG.RECORD
  LOCALS| T.DIALOG N.HANDLE  |
  CREATE HERE T.DIALOG @ 4* 8+   ALLOT
  T.DIALOG SWAP T.DIALOG @ 4* 8+   CMOVE
  N.HANDLE UNLOCK.HANDLE
  N.HANDLE TO.HEAP
  DOES> ;


: INIT.DIALOG                \ dialog.record -- sets up dialog
    BEGIN.DIALOG
    DPUSH  ;

: QUIT.DIALOG
    DPOP END.DIALOG ;

\ dialog handler , define dialog record for
\ ResEdit created DLOG using :

\  DIALOGID  NEW.DIALOG.RECORD
\    1  MAKE.ACTIVE.ITEM OK.BUTTON
\    2  MAKE.TEXT.ITEM NAME.TEXT
\  NAME.DIALOG.RECORD MY.DIALOG.RECORD

\ MY>DIALOG>RECORD HANDLE.DIALOG


: HANDLE.DIALOG             \ Dialog.Record -- runs dialog
  LOCALS| C.DIALOG |
  0 LAST.RADIO.ITEM !          \ init radio global
  C.DIALOG DIALOG.OF INIT.DIALOG     \ open dialog window , push dialog.ptr ond.stack
  C.DIALOG GET.ITEMS           \ Fetch item handles
    C.DIALOG SET.ITEMS           \ set boleans and text
  BEGIN
    DO.MODAL.DIALOG          \ handle modal events
      DUP C.DIALOG HANDLE.ITEMS    \ handle item events
  1 = UNTIL                  \ until ok
  C.DIALOG GET.ITEM.DATA        \ fetch new data to record
    QUIT.DIALOG ;              \ end of dialog


\ modeless dialog handler
\ use in the form :

\  New.Window My.M.Dialog
\  MyDialogID My.M.Dialog Add.Dialog

\  : MyModeLess
\    My.Dialog.Record Handle.Modeless ;

\  : Update.My.M.Dialog
\    My.M.Dialog Draw.Dialog ;

\  My.M.Dialog On.Activate MyModeLess
\  My.M.Dialog On.Update Update.My.M.Dialog


  : HANDLE.MODELESS           \ dialog.ptr -- handles dialog window
  LOCALS| C.DIALOG |
```

```
IF GET.WINDOW DPUSH          \ push current dialog on a stack
    C.DIALOG GET.ITEMS        \ fetch item handles, rects
    C.DIALOG SET.ITEMS        \ set booleans, text
   BEGIN              \ start of event handling
  DO.EVENTS IN.CLOSE.BOX = IF   \ check for close
    GET.WINDOW CLOSE.DIALOG
  THEN
  ?KEYSTROKE IF DROP THEN      \ handle keystrokes
  DIALOG.EVENT?          \ check for dialog events
    IF SWAP DGET = IF       \ if dialog event check for current
    C.DIALOG HANDLE.ITEMS      \ if current handle items
    THEN
    ELSE 2DROP THEN       \ else drop dialog event args
  AGAIN              \ endless loop until deactivated
 ELSE
  C.DIALOG GET.ITEM.DATA      \ if deactivated fetch changes
  DPOP DROP             \ pop dialog from stack
 THEN  ;

: CLEAR.STRING DUP ITEM.RECORD ITEM.STRING - BLANKS ;

 ( NUMBER>$  #>$! )                              ( 092486 YH )

 : NUMBER>$            ( NUMBER ! COUNT, ADDRESS OF STRING )
   BASE @ 10 = IF
   DUP ABS
   <# #S SWAP SIGN #>
   ELSE  <# #S #>
   THEN ;

 : #>$!             ( NUMBER, ADDRESS : STORES STRING AT ADDRESS )
    >R
    NUMBER>$ DUP
    R@ C! R>
    1+ SWAP CMOVE ;

 : #>CHARS!          ( NUMBER, ADDRESS   STORES CHARS AT ADDRESS )
    >R  NUMBER>$
    R> SWAP CMOVE ;


( NNUMBER )                                     ( 092486 YH )

 : NNUMBER                ( ADDRESS . NUMBER )
  1+ 0 SWAP               ( CONVERTS NUMBER TO STRING, DROPS BLANKS)
   BEGIN
     DUP C@ 32 =            ( if blank, inc address )
     WHILE  1+  REPEAT
      DUP C@ 45 = IF        ( if minus sign, set -1 multiplicand )
        -1 >R 1+ ELSE
         1 >R THEN          ( if not set 1 mult. )
   1- CONVERT DROP R> * ;    ( covert and reconcile minus )
```

```
\ displays background screen to whole monitor screen and then
\ calls a code resource that may have a driver for single frame recorders

anew -display2screen-

  NEW.WINDOW SCREEN.CPORT
  NEW.WINDOW THE.UPDATE.WINDOW

  0 constant display.task
  0 constant display.init

  : OPEN.SCREEN.CPORT                    \ window -- opens as background color port
    SCREEN.CPORT
      0 get.window 0 0
    LOCALS| the.map the.clut LAST.WIN THE.CBITS THE.WIN  |    \ define locals
    THE.WIN  OPENCPORT                   \ open the color port
    THE.WIN  ^PIX.MAP.OF  TO THE.CBITS            \ cbits = ^Pix.map
    DFLTQDPROCS THE.WIN  104 + !              \ set the default graphic procedures
    LAST.WIN (WINDOW) ;


:  DefaultDisplayTask
  0 LOCALS| THE.SEG |
  ASCII CODE " SWIVDisplay" GET.NAMED.RESOURCE TO THE.SEG
  THE.SEG 0 > IF
    THE.SEG LOCK.HANDLE
    THE.SEG @ >JSR
    THE.SEG UNLOCK.HANDLE
    THE.SEG RELEASE.RESOURCE
  ELSE
    10 SYSBEEP
    BEGIN
      MOUSE.BUTTON
    UNTIL
  THEN ;

find DefaultDisplayTask ' display.task !

:  DefaultDisplayInit
  0 LOCALS| THE.SEG |
  ASCII CODE " SWIVInitDisplay" GET.NAMED.RESOURCE TO THE.SEG
  THE.SEG 0 > IF
    THE.SEG LOCK.HANDLE
    THE.SEG @ >JSR
    THE.SEG UNLOCK.HANDLE
    THE.SEG RELEASE.RESOURCE
  THEN ;


find DefaultDisplayInit ' display.init !


: OpenUpdateWindow
  Screen.bounds @rect THE.UPDATE.WINDOW w.bounds
  THE.UPDATE.WINDOW ADD.WINDOW ;

: CloseUpdateWindow
  THE.UPDATE.WINDOW close.WINDOW ;


510 MakeSwapOver WRITE.SCREEN.DISPLAY

StartSwapOver
```

```
: DisplayBackport
 BACK.BITS  6 + @RECT
 TEMP.RECT !RECT
 SCREEN.CPORT 16 + 4+ W@ BACK.BITS 6 + 4+ W@ - 2/
 DUP TEMP.RECT W@ + TEMP.RECT W!
 TEMP.RECT 4+ W@ + TEMP.RECT 4+ W!
 SCREEN.CPORT 16 + 6 + W@ BACK.BITS 6 + 6 + W@ - 2/
 DUP TEMP.RECT 2+ W@ + TEMP.RECT 2+ W!
 TEMP.RECT 6 + W@ + TEMP.RECT 6 + W!
 SCREEN.CPORT 16 + @rect
 swap 2swap swap 2swap
 black pattern rectangle
 save.clip >R
 temp.rect clip.rect
 BACK.BITS
 SCREEN.CPORT 2+
 BACK.BITS  6 + TEMP.RECT
 0 0 copy.bits
 R> restore.clip ;


: Display2Screen
  GET.WINDOW LOCALS| THE.WIN
  SCREEN.CPORT 2+ @ 0= IF
    OPEN.SCREEN.CPORT
  THEN
  OpenUpdateWindow
  SCREEN.CPORT WINDOW
  DisplayBackport
  hide.cursor
  display.task execute
  init.cursor
  Draw.Menu.Bar
  CloseUpdateWindow
  THE.WIN (WINDOW)
  flush.events ;

SetSwapOverToken
EndSwapOver
```

```
\ displays background screen to whole monitor screen and then
\ calls a code resource that may have a driver for single frame recorders

\ anew -display32screen-

511 MakeSwapOver WRITE.24.SCREEN.DISPLAY

StartSwapOver


Create Red.RGB  color.scale w, 0 ,
Create Green.RGB  0 w, color.scale w, 0 w,
Create Blue.RGB  0 , color.scale w,
34 constant colormode

: SepColor>RGB
  LOCALS| The.RGB Sep.RGB THE.INDEX |               \ set locals
  256 the.index - to the.index
  Sep.RGB w@ the.index 256 */ The.RGB w!
  Sep.RGB 2+ w@ the.index 256 */ The.RGB 2+ w!
  Sep.RGB 4+ w@ the.index 256 */ The.RGB 4+ w! ;


: SepColor>CLUT                              \ sets the gdevice for one color key
  0 0 0 LOCALS| THE.MAP MAP.RGB THE.CLUT Sep.RGB THE.INDEX  .    \ set locals
  BACK.GDEVICE @ @ +GDPMAP @  TO THE.MAP               \ find the gdevice pixmap
  THE.MAP @ +PMTABLE @ TO THE.CLUT               \ find the gdevice clut
  THE.CLUT LOCK.HANDLE                         \ lock the gdevice clut
  THE.CLUT @ +CTTABLE                          \ address of spec array
  THE.INDEX COLORSPEC * +                        \ address of index in array
  +CSRGBCOLOR TO MAP.RGB                         \ map.rgb is the destination
    THE.INDEX SEP.RGB MAP.RGB SepColor>RGB
  THE.CLUT UNLOCK.HANDLE  ;


  : SetSeparation                            \ sets all color keys into the gdevice clut
  0 0 LOCALS| THE.MAP THE.CLUT Sep.RGB                \ make space for locals
  SWIV.COLORS @ @ +CTSIZE W@ 1+ 0 DO               \ loop for the number of keys
    I Sep.RGB SepColor>CLUT                     \ set this one index into the gdevice clut
  LOOP
  BACK.GDEVICE @ @ +GDPMAP @  TO THE.MAP               \ find the gdevice pixmap
  THE.MAP @ +PMTABLE @ TO THE.CLUT
  THE.CLUT @ +CTSEED @ 8 +
  THE.CLUT @ +CTSEED !                          \ change the seed
  SET.SWIV.COLORS
  BUILD.KEY.SHADOW.TABLE
  BACKGDEVICE>PALETTE
  SET.WORLD.PALETTE.INDEX ;


   : MAKE.Sep.PICT               \ write a pict from the current object
     0 LOCALS| C.PICT |            \ define locals
      Error.flag 0=
      Exit.Flag 0= and if
       ENTER.CURRENT.BACKPORT
       BACK.BITS 6+ @RECT
         PICT.RECT !RECT          \ clip pict.rect to
       SAVE.CLIP >R
         PICT.RECT CLIP.RECT
         PICT.RECT OPEN.PICTURE
         TO C.PICT             \ open the picture
         BACK.BITS             \ blit from itself to itself
         GET.WINDOW 2+
             PICT.RECT  DUP          \ use the calculated rect
```

```
      colormode 0 COPY.BITS         \ do the copy
      CLOSE.PICTURE              \ close the picture
    QDError to Error.Flag
    R> RESTORE.CLIP            \ close the picture
  EXIT.CURRENT.BACKPORT
  C.PICT
then ;

: set.display.rect
  BACK.BITS  6 + @RECT
  TEMP.RECT !RECT
  SCREEN.CPORT 16 + 4+ W@ BACK.BITS 6 + 4+ W@ - 2/
  DUP TEMP.RECT W@ + TEMP.RECT W!
  TEMP.RECT 4+ W@ + TEMP.RECT 4- W!
  SCREEN.CPORT 16 + 6 + W@ BACK.BITS 6 - 6 + W@ - 2/
  DUP TEMP.RECT 2+ W@ + TEMP.RECT 2- W!
  TEMP.RECT 6 - W@ + TEMP.RECT 6 - W!
  ;

: (Display32screen)
  0 0 0 0 0 0 locals| the.mono HALF.COLOR RedPict GreenPict BluePict C.PICT
  Halftone.color @ to HALF.COLOR
  monochrome? to the.mono
  -1 to monochrome?
  0 to error.flag
  0 to exit.flag
  1 HALFTONE.COLOR !
  RED.RGB SetSeparation
  SetMaterialsChanged
  DO.EFFECTS.RENDER
  MAKE.Sep.PICT to RedPict
  Error.flag 0=
  Exit.Flag 0= and
  RedPict 0> and if
    2 HALFTONE.COLOR !
    GREEN.RGB SetSeparation
    SetMaterialsChanged
    DO.EFFECTS.RENDER
    MAKE.Sep.PICT to GreenPict
    Error.flag 0=
    Exit.Flag 0= and
    GreenPict 0> and if
      3 HALFTONE.COLOR !
      BLUE.RGB SetSeparation
      SetMaterialsChanged
      DO.EFFECTS.RENDER
      MAKE.Sep.PICT to BluePict
      Error.flag 0=
      Exit.Flag 0= and
      BluePict 0> and if
        ENTER.CURRENT.BACKPORT
        BACK.BITS 6+ @RECT
          PICT.RECT !RECT          \ clip pict.rect to
        SAVE.CLIP >R
        PICT.RECT CLIP.RECT
        PICT.RECT OPEN.PICTURE
        TO C.PICT                \ open the picture
        PICT.RECT @rect
        SWAP 2SWAP SWAP 2SWAP
        BLACK PATTERN RECTANGLE
        redpict PICT.RECT DRAW.PICTURE
        redpict dispose.picture
```

```
        0 to redpict
        greenpict PICT.RECT DRAW.PICTURE
        greenpict dispose.picture
        0 to greenpict
        bluepict PICT.RECT DRAW.PICTURE
        bluepict dispose.picture
        0 to bluepict
        CLOSE.PICTURE
        QDError to Error.Flag
        R> RESTORE.CLIP
        C.PICT 0 >
        EXIT.CURRENT.BACKPORT
        error.flag 0= and if
          0 0 zbuffery zbufferx temp.rect !rect   \ temp rect is bounds of the map
          SCREEN.CPORT 2+ @ 0= IF
            OPEN.SCREEN.CPORT
          THEN
          OpenUpdateWindow
          SCREEN.CPORT WINDOW
          set.display.rect
          SCREEN.CPORT 16 + @rect
          swap 2swap swap 2swap
          black pattern rectangle
          C.PICT temp.rect draw.picture
          hide.cursor
          display.task execute
          Draw.Menu.Bar
          CloseUpdateWindow
          show.cursor
          watch set.cursor
        then
      then
    then
  then
  redpict if
    redpict  dispose.picture
  then
  greenpict if
    greenpict dispose.picture
  then
  bluepict if
    bluepict dispose.picture
  then
  do.error.alert
  0 to error.flag
  the.mono to monochrome?
  half.color HALFTONE.COLOR !
  INIT.WINDOW.PALETTE
  SET.WORLD.PALETTE.INDEX
  SetMaterialsChanged
  WORLD.OBJECT set.current.object
  redraw.object
  flush.events ;

: Display32screen
  Output.Depth @ 8 > if
    (Display32screen)
  else
    6 201 ResString     \ " Unable to display a 32 bit image on this device ... "
    "" "" ""
    401 IssueAlert  drop
  then
;
```

```
SetSwapOverToken
EndSwapOver
```

```
\ D.ARROW PANEL
\ LAST REVISION: 11/15/87  05:14:06 PM   YH

cr ." loading Double Arrow Panel "

 Anew --double.arrow.panel--

CREATE THIS.D.ARROW 3 ,
CREATE ARROW.SYMETRY -1 ,

601 MakeSwapOver DO.D.ARROW.PANEL
StartSwapOver

 8011  NEW.DIALOG.RECORD

   1 MAKE.ACTIVE.ITEM D.ARROW.OK
   2 MAKE.ACTIVE.ITEM D.ARROW.CANCEL
   3 MAKE.RADIO.ITEM D.ARROW.SYM
   4 MAKE.RADIO.ITEM D.ARROW.ASYM


    NAME.DIALOG.RECORD  D.ARROW.PANEL

  1 D.ARROW.SYM !


      : DA.BYE
      LOCALS| C.ITEM HIT.ITEM C.RECORD
      0 LAST.RADIO.ITEM !
    DROP 1   ;

  FIND DA.BYE D.ARROW.CANCEL !          \ set cancel to not effect buffer size


  : HANDLE.D.ARROW
    LOCALS| C.ITEM |
      C.ITEM THIS.D.ARROW !
    C.ITEM CASE
    3 OF  -1 ARROW.SYMETRY ! ENDOF
    4 OF   0 ARROW.SYMETRY ! ENDOF
    ENDCASE  ;


  : (DO.D.ARROW.PANEL)            \ Dialog.Record -- runs dialog
    INIT.CURSOR
    D.ARROW.PANEL
    LOCALS| C.DIALOG |
    0 LAST.RADIO.ITEM !          \ init radio globa.
    C.DIALOG DIALOG.OF INIT.DIALOG    \ open dialog window , push dialog.ptr ond.stack
    C.DIALOG GET.ITEMS           \ fetch item handles
      C.DIALOG SET.ITEMS          \ set boleans and text
    THIS.D.ARROW @ C.DIALOG HANDLE.ITEMS
    BEGIN
      DO.MODAL.DIALOG          \ handle modal events
        DUP C.DIALOG HANDLE.ITEMS   \ handle item events
    1 = UNTIL              \ until ok
    C.DIALOG GET.ITEM.DATA          \ fetch new data to record
      QUIT.DIALOG             \ end of dialog
    LAST.RADIO.ITEM @ 0 > IF
       LAST.RADIO.ITEM @
      HANDLE.D.ARROW
    THEN
    discard.activates
    ;
```

```
SetSwapOverToken
EndSwapOver
```

```
\ DRAWS ARROWS ON DIALOG BOXES

ANEW THOSE.ARROWS

cr ." Loading arrow drawing..."

   CREATE TEMP.PICT.RECT 0 ,  300 W, 300 W,

: MAKE.TEMP.PICT.RECT                \ x y  RECT2 -- T.RECT  RECT1 OFFSET FOR 0, 0, OF RECT2
  0 0 LOCALS| TX TY C.Y C.X P.RECT
  P.RECT 4+ W@  P.RECT W@ - TO TY
  P.RECT 6 + W@ P.RECT 2+ W@ - TO TX
  C.Y   TY 2/ -  TEMP.PICT.RECT W!
  C.X   TX 2/ -  TEMP.PICT.RECT 2 + W!
  C.Y TY  DUP 2/ -  + TEMP.PICT.RECT 4+ W!
  C.X TX  DUP 2/ -  + TEMP.PICT.RECT 6+ W!
  TEMP.PICT.RECT  ;

  : 4DUP 4 NEEDED  4 PICK 4 PICK 4 PICK 4 PICK ;

  : DRAW.ARROW                    \ X , Y  PICT.ID -- SHOWS CARD PICT WITHIN RECT IF THERE IS ONE
    GET.PICTURE
  LOCALS| PICT.HANDLE P.Y P.X
  PICT.HANDLE 0 = NOT IF
     PICT.HANDLE DUP @ 2+
     P.X P.Y
     MAKE.TEMP.PICT.RECT
     DRAW.PICTURE
  THEN  ;

  : DRAW.POS.ARROW               \ YAW.ANGLE PITCH.ANGLE X Y -- DRAW ARROW
    LOCALS| A.Y A.X A.PITCH A.YAW
    A.X A.Y
    POS.ARROWS
    A.YAW 30 /
    A.PITCH 30 / 12 * + +
      DRAW.ARROW ;

  : RDRAW.Z.ARROW
    0 0 LOCALS| A.PITCH A.YAW  A.Y A.X
    A.X A.Y
    CURRENT.OBJECT @ >R
    UP.TREE PLUCK
    SET.CURRENT.OBJECT
    OBJECT.ACOS PLUCK
    R> SET.CURRENT.OBJECT
    ANGLE ANGLE.SCALE 2/ + ANGLE.SCALE /   TO A.YAW
      ANGLE ANGLE.SCALE 2/ - ANGLE.SCALE /    TO A.PITCH
    2DROP
    POS.ARROWS
    A.YAW 15 + 360 MOD 30 /
    A.PITCH 15 + 360 MOD 30 / 12 * - -
      DRAW.ARROW ;

   : RDRAW.X.ARROW
     0 0 LOCALS| A.PITCH A.YAW  A.Y A.X
     A.X A.Y
     CURRENT.OBJECT @ >R
     UP.TREE PLUCK
```

```
SET.CURRENT.OBJECT
SET.TEST.VEC
0 ROL 0 PITCH
FULL.ANGLE 4/  YAW
TEST.SWIVEL
OBJECT.ACOS COSINES SWAP MOVE.RECORD
TEST.SWIVEL
GET.ATTITUDE
R> SET.CURRENT.OBJECT
T.VARS COS.LENGTH LPLUCK
ANGLE ANGLE.SCALE 2/ + ANGLE.SCALE /   TO A.YAW
  ANGLE ANGLE.SCALE 2/ + ANGLE.SCALE /   TO A.PITCH
2DROP
POS.ARROWS
A.YAW 15 + 360 MOD 30 /
A.PITCH 15 + 360 MOD 30 / 12 * - +
  DRAW.ARROW ;

: RDRAW.Y.ARROW
 0 0 LOCALS| A.PITCH A.YAW  A.Y A.X
 A.X A.Y
 CURRENT.OBJECT @ >R
 UP.TREE PLUCK
 SET.CURRENT.OBJECT
 SET.TEST.VEC
 0 ROL FULL.ANGLE 4/ PITCH 0 YAW
 TEST.SWIVEL
 OBJECT.ACOS COSINES SWAP MOVE.RECORD
 TEST.SWIVEL
 GET.ATTITUDE
 R> SET.CURRENT.OBJECT
 T.VARS COS.LENGTH LPLUCK
 ANGLE ANGLE.SCALE 2/ + ANGLE.SCALE     TO A.YAW
   ANGLE ANGLE.SCALE 2/ - ANGLE.SCALE /   TO A.PITCH
 2DROP
 POS.ARROWS
 A.YAW 15 + 360 MOD 30 /
 A.PITCH 15 + 360 MOD 30 / 12 * - +
   DRAW.ARROW ;


: RDRAW.POS.ARROWS
 38 55 RDRAW.X.ARROW
 38 95 RDRAW.Y.ARROW
 38 135 RDRAW.Z.ARROW ;


: ADRAW.Z.ARROW
 0 0 LOCALS| A.PITCH A.YAW  A.Y A.X
 A.X A.Y
 0 YAW 0 PITCH 0 ROL
 COSINES COS.LENGTH LPLUCK
 ANGLE ANGLE.SCALE 2/ + ANGLE.SCALE /   TO A.YAW
   ANGLE ANGLE.SCALE 2/ + ANGLE.SCALE /   TO A.PITCH
 2DROP
 POS.ARROWS
 A.YAW 15 + 360 MOD 30 /
 A.PITCH 15 + 360 MOD 30 / 12 * - +
   DRAW.ARROW ;


: ADRAW.X.ARROW
 0 0 LOCALS| A.PITCH A.YAW  A.Y A.X
 A.X A.Y
```

```
SET.TEST.VEC
0 ROL 0 PITCH
FULL.ANGLE 4/ YAW
COSINES COS.LENGTH LPLUCK
ANGLE ANGLE.SCALE 2/ + ANGLE.SCALE /   TO A.YAW
  ANGLE ANGLE.SCALE 2/ + ANGLE.SCALE /   TO A.PITCH
2DROP
POS.ARROWS
A.YAW 15 + 360 MOD 30 /
A.PITCH 15 + 360 MOD 30 / 12 * - -
  DRAW.ARROW ;

: ADRAW.Y.ARROW
 0 0 LOCALS| A.PITCH A.YAW  A.Y A.X
 A.X A.Y
 0 ROL FULL.ANGLE 4/ PITCH 0 YAW
 COSINES COS.LENGTH LPLUCK
 ANGLE ANGLE.SCALE 2/ + ANGLE.SCALE /   TO A.YAW
   ANGLE ANGLE.SCALE 2/ + ANGLE.SCALE /   TO A.PITCH
 2DROP
 POS.ARROWS
 A.YAW 15 + 360 MOD 30 /
 A.PITCH 15 + 360 MOD 30 / 12 * - -
   DRAW.ARROW ;

: ADRAW.POS.ARROWS
 38 55 ADRAW.X.ARROW
 38 95 ADRAW.Y.ARROW
 38 135 ADRAW.Z.ARROW ;

: RDRAW.ROL.ARROW
 0 0 LOCALS| A.PITCH A.YAW  A.Y A.X
 A.X A.Y
 SET.TEST.VEC
 OBJECT.RCOS COSINES SWAP MOVE.RECORD
 0 ROL
 TEST.SWIVEL
 CURRENT.OBJECT @ >R
 UP.TREE PLUCK
 SET.CURRENT.OBJECT
 OBJECT.ACOS COSINES SWAP MOVE.RECORD
 TEST.SWIVEL
 R> SET.CURRENT.OBJECT
 GET.ATTITUDE
 T.VARS COS.LENGTH LPLUCK
 ANGLE ANGLE.SCALE 2/ + ANGLE.SCALE /   TO A.YAW
   ANGLE ANGLE.SCALE 2/ + ANGLE.SCALE /   TO A.PITCH
 2DROP
 ATT.ARROWS
 A.YAW 15 + 360 MOD 30 /
 A.PITCH 15 + 360 MOD 30 / 12 * - -
   DRAW.ARROW ;

: RDRAW.PITCH.ARROW
 0 0 LOCALS| A.PITCH A.YAW  A.Y A.X
 A.X A.Y
 SET.TEST.VEC
 FULL.ANGLE 4/ NEG YAW 0 ROL 0 PITCH
 TEST.SWIVEL
 OBJECT.RCOS COSINES SWAP MOVE.RECORD
```

```
 0 ROL 0 PITCH
 TEST.SWIVEL
 CURRENT.OBJECT @ >R
 UP.TREE PLUCK
 SET.CURRENT.OBJECT
 OBJECT.ACOS COSINES SWAP MOVE.RECORD
 TEST.SWIVEL
 R> SET.CURRENT.OBJECT
 GET.ATTITUDE
 T.VARS COS.LENGTH LPLUCK
 ANGLE ANGLE.SCALE 2/ + ANGLE.SCALE /   TO A.YAW
   ANGLE ANGLE.SCALE 2/ + ANGLE.SCALE /   TO A.PITCH
 2DROP
 ATT.ARROWS
 A.YAW 15 + 360 MOD 30 /
 A.PITCH 15 + 360 MOD 30 / 12 * + +
   DRAW.ARROW ;

: RDRAW.YAW.ARROW
 0 0 LOCALS| A.PITCH A.YAW  A.Y A.X
 A.X A.Y
 SET.TEST.VEC
 0 YAW 0 ROL FULL.ANGLE 4/ PITCH
 TEST.SWIVEL
 CURRENT.OBJECT @ >R
 UP.TREE PLUCK
 SET.CURRENT.OBJECT
 OBJECT.ACOS COSINES SWAP MOVE.RECORD
 TEST.SWIVEL
 R> SET.CURRENT.OBJECT
 GET.ATTITUDE
 T.VARS COS.LENGTH LPLUCK
 ANGLE ANGLE.SCALE 2/ + ANGLE.SCALE /   TO A.YAW
   ANGLE ANGLE.SCALE 2/ + ANGLE.SCALE /   TO A.PITCH
 2DROP
 ATT.ARROWS
 A.YAW 15 + 360 MOD 30 /
 A.PITCH 15 + 360 MOD 30 / 12 * + +
   DRAW.ARROW ;

: RDRAW.ATT.ARROWS
 38 55 RDRAW.YAW.ARROW
 38 95 RDRAW.PITCH.ARROW
 38 135 RDRAW.ROL.ARROW ;


: ADRAW.ROL.ARROW
 0 0 LOCALS| A.PITCH A.YAW  A.Y A.X
 A.X A.Y
 SET.TEST.VEC
 OBJECT.ACOS COSINES SWAP MOVE.RECORD
 0 ROL
 TEST.SWIVEL
 GET.ATTITUDE
 T.VARS COS.LENGTH LPLUCK
 ANGLE ANGLE.SCALE 2/ + ANGLE.SCALE /   TO A.YAW
   ANGLE ANGLE.SCALE 2/ + ANGLE.SCALE /   TO A.PITCH
 2DROP
 ATT.ARROWS
 A.YAW 15 + 360 MOD 30 /
 A.PITCH 15 + 360 MOD 30 / 12 * + +
   DRAW.ARROW ;
```

```
: ADRAW.PITCH.ARROW
  0 0 LOCALS| A.PITCH A.YAW  A.Y A.X
  A.X A.Y
  SET.TEST.VEC
  FULL.ANGLE 4/ NEG YAW 0 ROL 0 PITCH
  TEST.SWIVEL
  OBJECT.ACOS COSINES SWAP MOVE.RECORD
  0 ROL 0 PITCH
  TEST.SWIVEL
  GET.ATTITUDE
  T.VARS COS.LENGTH LPLUCK
  ANGLE ANGLE.SCALE 2/ + ANGLE.SCALE /   TO A.YAW
    ANGLE ANGLE.SCALE 2/ + ANGLE.SCALE /   TO A.PITCH
  2DROP
  ATT.ARROWS
  A.YAW 15 + 360 MOD 30 /
  A.PITCH 15 + 360 MOD 30 / 12 * - +
    DRAW.ARROW ;

: ADRAW.YAW.ARROW
  0 0 LOCALS| A.PITCH A.YAW  A.Y A.X
  A.X A.Y
  SET.TEST.VEC
  0 YAW 0 ROL FULL.ANGLE 4/ PITCH
  TEST.SWIVEL
  GET.ATTITUDE
  T.VARS COS.LENGTH LPLUCK
  ANGLE ANGLE.SCALE 2/ + ANGLE.SCALE /   TO A.YAW
    ANGLE ANGLE.SCALE 2/ + ANGLE.SCALE /   TO A.PITCH
  2DROP
  ATT.ARROWS
  A.YAW 15 + 360 MOD 30 /
  A.PITCH 15 + 360 MOD 30 / 12 * - +
    DRAW.ARROW ;

: ADRAW.ATT.ARROWS
  38 55  ADRAW.YAW.ARROW
  38 95  ADRAW.PITCH.ARROW
  38 135 ADRAW.ROL.ARROW ;
```

```
( DRAW.OBJECT  DRAW.TREE )                          ( 102386 YH )

anew -object.draw-

CR ." Loading object drawing ... "


CREATE GLOBAL.RENDER -1 ,


\ object bounds testing

  : CLEAR.CUBE.BOUNDS
  80000 -80000
  80000 -80000
  80000 -80000
  CUBE.BOUNDS 24 LPLACE
  ;


  : SCALE.CUBE.BOUNDS
  CUBE.BOUNDS 24 LPLUCK
  FIX.SCALE NEG SCALE
  XOFFSET @ + 3 + >R
  FIX.SCALE NEG SCALE
  XOFFSET @ + 3 - >R
  FIX.SCALE NEG SCALE
  YOFFSET @ + 2 + >R
  FIX.SCALE NEG SCALE
  YOFFSET @ + 2 - >R
  FIX.SCALE NEG SCALE >R
  FIX.SCALE NEG SCALE
  R> SWAP R> R> SWAP R> R> SWAP
  CUBE.BOUNDS 24 LPLACE ;


  : PUT.NEW.RECT.PROJECT  ( offsets rectangle and updates 2pos)
    CUBE.BOUNDS 24 LPLUCK
  LOCALS| MINX MAXX MINY MAXY MINZ MAXZ
    MINX 0 MAX
    MINY 0 MAX
    MAXX ZBUFFERX @ MIN
    MAXY 1+ ZBUFFERY @ MIN
    OBJECT.RECT  PLACE
    MINX   MAXX
    MINY   MAXY
    MINZ   MAXZ
  OBJECT.ACUBE PLACE
  OBJECT.A3POS PLUCK
    NPROJECT
  FIX>INTEGER DROP
    YOFFSET @ + SWAP XOFFSET @ + SWAP
    OBJECT.A2POS PLACE  ;


  : IN.VIEW.CUBE?
  OBJECT.ACUBE PLUCK
    0 LOCALS| VIS.FLAG MAXZ MINZ MAXY MINY MAXX MINX
  MAXZ Z.LIMITS 4+ @ > IF
    MINZ Z.LIMITS @ < IF
      MAXY 0 > IF
        MINY ZBUFFERY @ < IF
          MAXX 0 > IF
            MINX ZBUFFERX @ < IF
```

```
            -1 TO VIS.FLAG
            MINY 0 < IF
              POLYCLIP? @
              TOPCLIP OR
              POLYCLIP? !
            THEN
            MAXY ZBUFFERY @ > IF
              POLYCLIP? @
              BOTTOMCLIP OR
              POLYCLIP? !
            THEN
            MINX 0 < IF
              POLYCLIP? @
              LEFTCLIP OR
              POLYCLIP? !
            THEN
            MAXX ZBUFFERX @ > IF
              POLYCLIP? @
              RIGHTCLIP OR
              POLYCLIP? !
            THEN
          THEN
        THEN
      THEN
    THEN
  THEN
THEN
VIS.FLAG ;

 : IN.ZBOUNDS?
 locals| maxz minz |
 0
 maxz neg hitherplane @  < if
  minz neg hitherplane @ >
  hitherclip and
  PolyClip? @ or PolyClip? !
  minz yonplane @  < if
    maxz yonplane @ >
    yonclip and
    PolyClip? @ or PolyClip? !
      drop -1
  then
 then ;


create ^CLIP.POLY.MESH 0 ,


: PATH>MESH.FORM              \ converts a path object to a mesh.object
  CURRENT.HANDLE IF
    OBJECT.FORM  PLUCK PATH.FORM = IF
      GET.OBJECT
      THREE.LIST
      PUT.MESH
    ELSE
      10 SYSBEEP
    THEN
    ELSE
    10 SYSBEEP
  THEN    ;

\  animated watch cursor
```

```
GLOBAL WATCH#
0 TO WATCH#
356 CONSTANT WATCH.BASE

: SET.WATCH.CURSOR     \ RES ID -- SETS CURSOR
WATCH# 1+ 7 AND TO WATCH#
WATCH.BASE WATCH# +
  ASCII CURS SWAP GET.RESOURCE
  @ SET.CURSOR ;

\ sets low level poly rendering routines

CREATE SHOW.DRAWING 0 ,
0 CONSTANT ^DRAW.OBJECT

: SET.WIRE.COLOR
  OBJECT.PALETTE.INDEX PLUCK
  KEY.COLOR.RES @ *
  OBJECT.REFLECT PLUCK 3 * 4 /
  KEY.COLOR.RES @ 100 */
  KEY.COLOR.RES @ SWAP -
  KEY.COLOR.RES @ 1 - MIN
  0 MAX +
  LINE.PAT ! ;

CODE PUT.THREE
  A0 POP,
  SP )+ A0 )+ long move,
  SP )+ A0 )+ long move,
  SP )+ A0 )+ long move,
  next end-code

: GET.RCUBE.POINTS
  OBJECT.RCUBE PLUCK
  ALLPOINTS 8+ LOCALS| THE.POINTS MAXX MINX MAXY MINY MAXZ MINZ
  5 0 DO
    MINX MAXX + 2/  MINY MAXY + 2/  MAXZ
    THE.POINTS PUT.THREE
    THE.POINTS 12 + TO THE.POINTS
  LOOP
     MINX MINY MAXZ THE.POINTS PUT.THREE
    THE.POINTS 12 + TO THE.POINTS
    MAXX MINY MAXZ THE.POINTS PUT.THREE
    THE.POINTS 12 + TO THE.POINTS
    MAXX MAXY MAXZ THE.POINTS PUT.THREE
    THE.POINTS 12 + TO THE.POINTS
    MINX MAXY MAXZ THE.POINTS PUT.THREE
    THE.POINTS 12 + TO THE.POINTS
    MINX MINY MAXZ THE.POINTS PUT.THREE
    THE.POINTS 12 + TO THE.POINTS

    MINX MINY MINZ THE.POINTS PUT.THREE
    THE.POINTS 12 + TO THE.POINTS
    MAXX MINY MINZ THE.POINTS PUT.THREE
    THE.POINTS 12 + TO THE.POINTS
```

```
MAXX MAXY MINZ THE.POINTS PUT.THREE
THE.POINTS 12 + TO THE.POINTS
MINX MAXY MINZ THE.POINTS PUT.THREE
THE.POINTS 12 + TO THE.POINTS
MINX MINY MINZ THE.POINTS PUT.THREE
THE.POINTS 12 + TO THE.POINTS

5 0 DO
  MINX MAXX + 2/  MINY MAXY + 2/  MINZ
  THE.POINTS PUT.THREE
  THE.POINTS 12 + TO THE.POINTS
LOOP
4 ALLPOINTS !
5 ALLPOINTS 4+ ! ;


global FASTCUBE?
  0 to FASTCUBE?


: DRAW.PATH.FORM
    SET.ABSOLUTE              \ set absolute values
    GET.OBJECT                \ get the object
    Object.Material.Index pluck
    SetCurrentMaterial            \ set the material
    SET.WIRE.COLOR            \ set the wireframe from low level globals color
    GLOBAL.RENDER @ NOT IF          \ check for local render
      OBJECT.RENDER PLUCK
      RENDER.MODE !
    THEN
    THREE.LIST                \ set all.points list
    SET.ACUBE.BOUNDS              \ all.points not translated yet
       CUBE.BOUNDS OBJECT.RCUBE MOVE.RECORD  \ set relative cube
    FASTCUBE? IF
      GET.RCUBE.POINTS
    THEN
    TRANS.ALL.POINTS            \ translate the points
    RENDER.MODE @ PHONG = IF
      SET.ALLNORMALS
      MAKE.PHONG.NORMALS
    THEN
    IN.ZBOUNDS? IF
        POLYCLIP? @ NOT IF
        PROJECT.ALL.POINTS
        (GET.OBJECT.BOUNDS)
        PUT.NEW.RECT.PROJECT       \ set the rectangle
        IN.VIEW.CUBE? IF
          POLY.MESH            \ draw the object mesh
        THEN
      ELSE
        CLEAR.CUBE.BOUNDS
        POLY.MESH           \ renders and clips individual polys
        SCALE.CUBE.BOUNDS
        PUT.NEW.RECT.PROJECT       \ set the rectangle
      THEN
      0 POLYCLIP? !
    THEN  ;


: DRAW.MESH.FORM
  SET.ABSOLUTE                \ set absolute values
  GET.OBJECT                \ get the object
  Object.Material.Index pluck
  SetCurrentMaterial            \ set the material
```

```
SET.WIRE.COLOR                 set the wireframe from low level globals color
GLOBAL.RENDER @ NOT IF           \ check for local render
  OBJECT.RENDER PLUCK
  RENDER.MODE !
THEN
SET.ACUBE.BOUNDS              \ all.points not translated yet
    CUBE.BOUNDS OBJECT.RCUBE MOVE.RECORD  \ set relative cube
FASTCUBE? IF
  GET.RCUBE.POINTS
THEN
TRANS.ALL.POINTS              \ translate the points
RENDER.MODE @ PHONG = IF
  SET.ALLNORMALS
  MAKE.PHONG.NORMALS
THEN
IN.ZBOUNDS? IF
    POLYCLIP? @ NOT IF
    PROJECT.ALL.POINTS
    (GET.OBJECT.BOUNDS)
    PUT.NEW.RECT.PROJECT       \ set the rectangle
    IN.VIEW.CUBE? IF
      POLY.MESH             \ draw the object mesh
    THEN
  ELSE
    CLEAR.CUBE.BOUNDS
    POLY.MESH             \ renders and clips individual polys
    SCALE.CUBE.BOUNDS
    PUT.NEW.RECT.PROJECT       \ set the rectangle
  THEN
  0 POLYCLIP? !
THEN ;

: TRANS.SHADE.POINTS
  SHADE.POINTS LOCALS| THE.POINTS
  #POLY.POINTS @ 0 DO
    THE.POINTS TO.STACK
    CENTER.VECTOR
    SWIVEL
    SCALER
    OUT
    THE.POINTS
    FROM.STACK
    THE.POINTS 12 + TO THE.POINTS
  LOOP ;


: DRAW.SINGLE.POLY
  LOCALS| THE.LIST |
  THE.LIST W@ MAX.TYPE.POINTS MIN #POLY.POINTS !
  THE.LIST 2+ SHADE.POINTS #POLY.POINTS @ 12 * CMOVE
  TRANS.SHADE.POINTS
  DRAW.POLY ;


: DRAW.POLY.LIST
  OBJECT.TYPE DROP
  LOCALS| THE.LIST |
  BEGIN THE.LIST W@ WHILE
    THE.LIST DRAW.SINGLE.POLY
    THE.LIST W@ 12 * 2 +
    THE.LIST + TO THE.LIST
  REPEAT ;

CODE TEST.CUBE.BOUNDS
```

```
SAVE.REGS
DO POP, D1 POP, D2 POP,
CUBE.BOUNDS A0 ) #MOVE,          \ max x
A0 () D2 LONG CMP, PL IF,
  D2 A0 () LONG MOVE,
THEN,
4 A0 I) D2 LONG CMP, MI IF,    \ min x
  D2 4 A0 I) LONG MOVE,
THEN,

8 A0 I) D1 LONG CMP, PL IF,    \ max y
  D1 8 A0 I) LONG MOVE,
THEN,
12 A0 I) D1 LONG CMP, MI IF,   \ min y
  D1 12 A0 I) LONG MOVE,
THEN,

16 A0 I) D0 LONG CMP, PL IF,   \ max z
  D0 16 A0 I) LONG MOVE,
THEN,
20 A0 I) D0 LONG CMP, MI IF,   \ min z
  D0 20 A0 I) LONG MOVE,
THEN,
RESTORE.REGS
NEXT
END-CODE

: SET.POLY.BOUNDS
  LOCALS| THE.LIST |
  THE.LIST W@ MAX.TYPE.POINTS MIN 0 DO
    THE.LIST I 12 * + 2+ TO.STACK
    TEST.CUBE.BOUNDS
  LOOP ;


: SET.POLY.FORM.BOUNDS
  OBJECT.TYPE DROP
  LOCALS| THE.LIST |
  CLEAR.CUBE.BOUNDS
  BEGIN THE.LIST W@ WHILE
    THE.LIST SET.POLY.BOUNDS
    THE.LIST W@ 12 * 2 +
    THE.LIST + TO THE.LIST
  REPEAT ;


: DRAW.POLY.FORM
  SET.ABSOLUTE                 \ set absolute values
  GET.OBJECT                 \ get the object
  Object.Material.Index pluck
  SetCurrentMaterial             \ set the material
  SET.WIRE.COLOR               \ set the wireframe from low level globals color
  GLOBAL.RENDER @ NOT IF           \ check for local render
    OBJECT.RENDER PLUCK
    RENDER.MODE !
  THEN
  SET.POLY.FORM.BOUNDS
  CUBE.BOUNDS OBJECT.RCUBE MOVE.RECORD    \ set relative cube
  FASTCUBE? IF
    GET.RCUBE.POINTS
    TRANS.ALL.POINTS             \ translate the points
    IN.ZBOUNDS? IF
        POLYCLIP? @ NOT IF
        PROJECT.ALL.POINTS
```

```
      (GET.OBJECT.BOUNDS)
      PUT.NEW.RECT.PROJECT       \ set the rectangle
      IN.VIEW.CUBE? IF
        POLY.MESH            \ draw the object mesh
      THEN
    ELSE
      CLEAR.CUBE.BOUNDS
      POLY.MESH            \ renders and clips individual polys
      SCALE.CUBE.BOUNDS
      PUT.NEW.RECT.PROJECT       \ set the rectangle
    THEN
  THEN
ELSE
  -1 POLYCLIP? !
  CLEAR.CUBE.BOUNDS
  RENDER.MODE @ >R
  RENDER.MODE @ PHONG = IF
    SHADED RENDER.MODE !
  THEN
  DRAW.POLY.LIST
  R> RENDER.MODE !
  SCALE.CUBE.BOUNDS
  PUT.NEW.RECT.PROJECT
THEN
0 POLYCLIP? !  ;


\ POLYNORMAL.FORM DRAWING

: TRANS.NORMAL.POINTS
  NORMAL.POINTS LOCALS| THE.POINTS |
  #POLY.POINTS @ 0 DO
    THE.POINTS TO.STACK
    SWIVEL
    SWAP ROT
    THE.POINTS
    FROM.STACK
    THE.POINTS 12 + TO THE.POINTS
  LOOP ;

: DRAW.SINGLE.POLYNORMAL
  LOCALS| THE.LIST |
  THE.LIST W@ MAX.TYPE.POINTS MIN #POLY.POINTS !
  THE.LIST 2+ SHADE.POINTS #POLY.POINTS @ 12 * CMOVE
  THE.LIST THE.LIST W@ 12 * 2 - -
    NORMAL.POINTS #POLY.POINTS @ 12 * CMOVE
  TRANS.SHADE.POINTS
  TRANS.NORMAL.POINTS
  DRAW.POLY ;

: DRAW.POLYNORMAL.LIST
  OBJECT.TYPE DROP
  LOCALS| THE.LIST |
  BEGIN THE.LIST W@ WHILE
    THE.LIST DRAW.SINGLE.POLYNORMAL
    THE.LIST W@ 24 * 2 +
    THE.LIST + TO THE.LIST
  REPEAT ;


: SET.POLYNORMAL.BOUNDS
  LOCALS| THE.LIST |
```

```
THE.LIST W@ MAX.TYPE.POINTS MIN 0 DO
  THE.LIST I 24 * + 2+ TO.STACK
  TEST.CUBE.BOUNDS
LOOP ;


: SET.NORMAL.FORM.BOUNDS
 OBJECT.TYPE DROP
 LOCALS| THE.LIST |
 CLEAR.CUBE.BOUNDS
 BEGIN THE.LIST W@ WHILE
   THE.LIST SET.POLY.BOUNDS
   THE.LIST W@ 24 * 2 +
   THE.LIST + TO THE.LIST
 REPEAT ;


: DRAW.POLYNORMAL.FORM
 SET.ABSOLUTE                  \ set absolute values
 GET.OBJECT                  \ get the object
 Object.Material.Index pluck
 SetCurrentMaterial            \ set the material
 SET.WIRE.COLOR               \ set the wireframe from low level globals color
 GLOBAL.RENDER @ NOT IF          \ check for local render
   OBJECT.RENDER PLUCK
   RENDER.MODE !
 THEN
 SET.NORMAL.FORM.BOUNDS
 CUBE.BOUNDS OBJECT.RCUBE MOVE.RECORD    \ set relative cube
 FASTCUBE? IF
   GET.RCUBE.POINTS
   TRANS.ALL.POINTS            \ translate the points
   IN.ZBOUNDS? IF
       POLYCLIP? @ NOT IF
       PROJECT.ALL.POINTS
       (GET.OBJECT.BOUNDS)
       PUT.NEW.RECT.PROJECT      \ set the rectangle
       IN.VIEW.CUBE? IF
         POLY.MESH           \ draw the object mesh
       THEN
     ELSE
       CLEAR.CUBE.BOUNDS
       POLY.MESH           \ renders and clips individual polys
       SCALE.CUBE.BOUNDS
       PUT.NEW.RECT.PROJECT      \ set the rectangle
     THEN
   THEN
 ELSE
   -1 POLYCLIP? !
   CLEAR.CUBE.BOUNDS
   DRAW.POLYNORMAL.LIST
   SCALE.CUBE.BOUNDS
   PUT.NEW.RECT.PROJECT
 THEN
 0 POLYCLIP? !  ;



: DRAW.PICT.FORM ;              \ currently does nothing

: DRAW.OP.FORM ;              \ currently does nothing
```

```
: DRAW.OBJECT                      \ draws the current object
     SET.WATCH.CURSOR
     OBJECT.STATE PLUCK UNUSED >            \ if its in use...
     CURRENT.OBJECT @ WORLD.OBJECT >  AND        \ not the meta world or world
  CURRENT.OBJECT @ LAST.OBJECT < AND IF       \ and within the range of objects
    OBJECT.FORM PLUCK                \ get the form of the object
    CASE
      MESH.FORM OF
        DRAW.MESH.FORM ENDOF         \ mesh form drawing
      PATH.FORM OF
        DRAW.PATH.FORM ENDOF         \ path form drawing
      PICT.FORM OF
        DRAW.PICT.FORM ENDOF         \ picture form drawing
      POLY.FORM OF
        DRAW.POLY.FORM   ENDOF         \ opcode form drawing
      POLYNORMAL.FORM OF
        DRAW.POLYNORMAL.FORM   ENDOF     \ opcode form drawing
      OP.FORM OF
        DRAW.OP.FORM   ENDOF         \ opcode form drawing

    ENDCASE
   THEN
   INIT.CURSOR  ;                    \ return cursor to its state


 FIND DRAW.OBJECT  ' ^DRAW.OBJECT !

 : DRAW.TREE OPERATION @  ^DRAW.OBJECT OPERATION !
   TRAVERSE.DOWN.TREE   OPERATION ! ;

( UPDATE.GROUP.CUBE )                            ( 081586 YH )


VARIABLE SAVE.OBJECT
VARIABLE NTEST.OBJECT

 : WRITE.OBJECT
   NEW.OBJECT  PUT.OBJECT
   DRAW.OBJECT  ;


( A.DRAW.WORLD )                                 ( 101586 YH )

 :  A.DRAW.WORLD    ( DRAWS WORLD FROM ABSOLUTE OBJECT INFO )
    CURRENT.OBJECT @
    WORLD.OBJECT SET.CURRENT.OBJECT
    DRAW.TREE
    SET.CURRENT.OBJECT  ;


( N.DRAW.WORLD )                                 ( 112086 YH )
 VARIABLE TEST.OBJECT   VARIABLE N.TEMP

 :  N.DRAW.WORLD    ( DRAWS WORLD FROM ABSOLUTE OBJECT INFO )
    CURRENT.OBJECT @ TEST.OBJECT !
    WORLD.OBJECT SET.CURRENT.OBJECT
    BEGIN  CURRENT.OBJECT @ 1 - SET.CURRENT.OBJECT
        OBJECT.STATE PLUCK UNUSED >  IF
         OBJECT.RECT TEST.RECT SWAP MOVE.RECORD
         CURRENT.OBJECT @ N.TEMP !
```

```
        TEST.OBJECT @ SET.CURRENT.OBJECT
        INTER.TREE  N.TEMP @ SET.CURRENT.OBJECT  IF
       DRAW.OBJECT  THEN  THEN
  OBJECT.STATE PLUCK
THE.END =
  CURRENT.OBJECT @
  LAST.OBJECT =  OR
  UNTIL
  TEST.OBJECT @ SET.CURRENT.OBJECT   ;


: S.DRAW.WORLD             \ DRAWS WORLD FROM ABSOLUTE OBJECT INFO
  CURRENT.OBJECT @ TEST.OBJECT !
  OBJECT.RECT  TEST.RECT SWAP MOVE.RECORD
  WORLD.OBJECT SET.CURRENT.OBJECT
 BEGIN
  CURRENT.OBJECT @ 1 +
  SET.CURRENT.OBJECT
      OBJECT.STATE PLUCK UNUSED >  IF
    TEST.RECT 8 WPLUCK
    OBJECT.RECT PLUCK
      RECT.INTERSECT? IF
          DRAW.OBJECT  THEN
    THEN
    OBJECT.STATE PLUCK THE.END =
    CURRENT.OBJECT @ LAST.OBJECT =   OR
  UNTIL
  TEST.OBJECT @
 SET.CURRENT.OBJECT   ;


( SET.STATE  SET.TREE.STATE )                       ( 081286 YH )
 VARIABLE NEW.STATE

: SET.STATE
  OBJECT.STATE PLUCK UNUSED = NOT IF
  NEW.STATE @ OBJECT.STATE PLACE
  THEN ;
  FIND SET.STATE CONSTANT ^SET.STATE


: SET.TREE.STATE ( STATE | SETS SIBLINGS DOWN TREE )
  NEW.STATE !
  OPERATION @ ^SET.STATE OPERATION !
  TRAVERSE.DOWN.TREE OPERATION ! ;


 : SET.ANY.STATE
  NEW.STATE @ OBJECT.STATE PLACE ;


  FIND SET.ANY.STATE CONSTANT ^SET.ANY.STATE


: SET.ANY.TREE.STATE ( STATE | SETS SIBLINGS DOWN TREE )
  NEW.STATE ! OPERATION @ ^SET.ANY.STATE OPERATION !
  TRAVERSE.DOWN.TREE OPERATION ! ;


( CLEAR.TEST )                                      ( 102286 YH )

 VARIABLE  BACK.PAT

 CREATE DEFAULT.RGB  0 W, 0 W, 0 W, 0 W,
```

```
  create temp.d.rect 0 , 0 ,

  : (DRAW.BACK.PICT)
  0 0 0 0 LOCALS| TY1 TX1 TY2 TX2
  CURRENT.OBJECT.PICT 0 = not IF
    CURRENT.OBJECT.PICT @ 2+ @RECT
    TRANS.PICT.RECT
     XOFFSET @ + SWAP
     YOFFSET @ + SWAP 2SWAP
     XOFFSET @ + SWAP
     YOFFSET @ + SWAP 2SWAP
    TEMP.D.RECT !RECT
    CURRENT.OBJECT.PICT
    TEMP.D.RECT
    DRAW.PICTURE
  THEN ;


hex
  : +fgcolor 50  + ;

decimal

: set.backport.index
  CURRENT.BACKPORT @ -fgcolor !  ;

: get.backport.index
  CURRENT.BACKPORT @ +fgcolor @  ;


 :  BACK.RECT
  TEMP.RECT !RECT
  CURRENT.OBJECT @ >R
  WORLD.OBJECT SET.CURRENT.OBJECT
  ENTER.CURRENT.BACKPORT
    OBJECT.PALETTE.INDEX PLUCK
    COLOR.INDEX !
    OBJECT.REFLECT PLUCK
    KEY.COLOR.RES @ 100 */
    KEY.COLOR.RES @ SWAP -
    KEY.COLOR.RES @ 1 - MIN
    0 MAX GET.COLOR.INDEX
    SET.BACKPORT.INDEX
      TEMP.RECT @RECT
    BLACK PATTERN RECTANGLE
    255 SET.BACKPORT.INDEX
  OBJECT.FORM PLUCK PICT.FORM = IF
    TEMP.RECT @RECT
    SWAP 2SWAP SWAP 2SWAP
    TEMP.RECT !RECT
    SAVE.CLIP >R
    TEMP.RECT CLIP.RECT
    GET.PICT.TYPE
    0 PICT.OBJECTY !
    0 PICT.OBJECTX !
    (DRAW.BACK.PICT)
    DELETE.OBJECT.PICT
    R> RESTORE.CLIP
  THEN
  R> SET.CURRENT.OBJECT
  EXIT.CURRENT.BACKPORT ;
```

```
: CLEAR.RECT      \ RECT : CLEARS RECT
 4DUP
 1+ >R >R 1+
 R> R>          \ ADJUSTS PIXEL ALIGNMENT
  BACK.RECT       \ DRAWS IN BACKGROUND
  ZERASE SET.ZRECT  ;



 : CLEAR.OBJECT.RECT  ( | CLEARS RECT )
   OBJECT.RECT PLUCK  CLEAR.RECT ;

   FIND  CLEAR.OBJECT.RECT  CONSTANT ^CLEAR.OBJECT.RECT

 : CLEAR.TREE.RECT  ( TOP OF TREE . CLEARS ZBUFFER, SCREEN )
 SET.WATCH.CURSOR
   OPERATION @
   ^CLEAR.OBJECT.RECT OPERATION !
   TRAVERSE.DOWN.TREE
   OPERATION !
 INIT.CURSOR ;

   VARIABLE NEXT.OBJECT
   VARIABLE MOVING.OBJECT

 : @POLY.RECT             \   -- X Y X Y GETS POLY CLIP
     TPOLY.XMIN @ TPOLY.YMIN @
   TPOLY.XMAX @ TPOLY.YMAX @  ;

 : !POLY.RECT
     TPOLY.YMAX !
   TPOLY.XMAX !
   2 - 0 max
   TPOLY.YMIN !
   TPOLY.XMIN !  ;


 VARIABLE TEMP.POLY.RECT 8 ALLOT

 : SET.POLY.BOUNDS           \ X Y X Y -- SETS POLY CLIP
   BOUNDS.RECT @RECT !POLY.RECT ;

 : RESTORE.POLY.BOUNDS        \ RESTORES POLY CLIP
   POLY.XMIN @ POLY.YMIN @
   POLY.XMAX @ POLY.YMAX @
   TPOLY.YMAX ! TPOLY.XMAX !
   TPOLY.YMIN ! TPOLY.XMIN ! ;


:  CLEAR.MOVING
   CURRENT.OBJECT @ >R
   WORLD.OBJECT SET.CURRENT.OBJECT
     BEGIN
     CURRENT.OBJECT @ 1 + SET.CURRENT.OBJECT
       CURRENT.OBJECT @ LAST.OBJECT = NOT WHILE
       OBJECT.STATE PLUCK MOVING = IF
       DELETE.OBJECT.RECORD
     THEN
       REPEAT
       R> SET.CURRENT.OBJECT  ;
```

```
( DRAW.WORLD/OBJECT, DRAW.WORLD/GROUP )          ( 081286 YH )

: REDRAW.JUST.ONE
 OBJECT.STATE PLUCK UNUSED > IF
     CLEAR.OBJECT.RECT
     PUT.OBJECT
     SET.ABSOLUTE
     MOVING OBJECT.STATE PLACE
  OBJECT.RECT PLUCK !POLY.RECT
      S.DRAW.WORLD
  RESTORE.POLY.BOUNDS
     ACTIVE OBJECT.STATE PLACE
     DRAW.OBJECT  THEN  ;


: REDRAW.OBJECT              \ redraws the current object
  CURRENT.OBJECT @             \ if the object is the world
     WORLD.OBJECT = IF
 OBJECT.RENDER PLUCK
 RENDER.MODE !
 SET.ABSOLUTE.LIGHTS          \ check for lighting/world change
 UpdateMaterials            \ Update the materials if needed
     0 0 ZBUFFERX @ ZBUFFERY @    \ clear the back.rect
   BACK.RECT
 CLEAR.ZBUFF             \ clear the zbuffer
     SET.ABSOLUTE            \ set the world absolute
     A.DRAW.WORLD            \ redraw the whole thing
  ELSE
     OBJECT.STATE PLUCK UNUSED > IF
  SET.TREE.BOUNDS            \ set the bounds of the current tree
  CLEAR.TREE.RECT            \ clear the zbuffer and back rect
  PUT.OBJECT               \ put the object
     SET.ABSOLUTE            \ set absolute
  MOVING SET.TREE.STATE       \ set state as moving
   SET.POLY.BOUNDS           \ set the bounds to avoid unecessary drawing
   N.DRAW.WORLD             \ draw the overlapped objects
   RESTORE.POLY.BOUNDS        \ restore the bounds
     ACTIVE SET.TREE.STATE       \ set the tree as active
     DRAW.TREE   THEN           \ draw the moved object
   THEN ;


find REDRAW.OBJECT ^redraw !

: DISPLAY.WORLD.OUTPUT
  GET.WINDOW >R
WORLD.OUTPUT WINDOW
  DISPLAY.WORLD
  VGRID
R> WINDOW ;


 : PRETTY.WORLD.OUTPUT
   GET.WINDOW >R  WORLD.OUTPUT WINDOW
   DISPLAY.WORLD  R> WINDOW ;
```

```
anew --draw.scroll.4--

   GLOBAL QUAD.SCROLL.RANGE
  2400 TO QUAD.SCROLL.RANGE


  : DRAW.ANY.QUAD
  10 PENMODE
  1 1 PENSIZE
  CURRENT.QUAD @ CASE
    CROSS.QUAD OF DRAW.SECTION CROSS.HAIR ENDOF
    TOP.QUAD OF DRAW.TOP CROSS.HAIR DRAW.TOP.NODE ENDOF
    SIDE.QUAD OF DRAW.SIDE CROSS.HAIR DRAW.SIDE.NODE ENDOF
  ENDCASE ;


  : SCROLL>QUAD
  CURRENT.QUAD @
  DUP  @RECT  LOCALS| GX GY LX LY C.QUAD  |
  @HPOS QUAD.SCROLL.RANGE 2/  -  NEG
  >Xmeasure.units THE.INTX / THE.INTX *
  Xmeasure.units>
    C.QUAD +X.CENTER W!
  @VPOS QUAD.SCROLL.RANGE 2/  -  NEG
  >Ymeasure.units THE.INTY / THE.INTY *
  Ymeasure.units>
  C.QUAD +Y.CENTER W!
  ;


  : QUAD>SCROLL
  CURRENT.QUAD @
  DUP  @RECT  LOCALS| GX GY LX LY C.QUAD  |
  C.QUAD +X.CENTER W@ EXT NEG QUAD.SCROLL.RANGE 2/ - !HPOS
  C.QUAD +Y.CENTER W@ EXT NEG QUAD.SCROLL.RANGE 2/ + !VPOS  ;


  : SET.QUAD.SCROLL              \ sets the scroll from world object's position
  FULL.QUAD @
  CURRENT.QUAD @ +SCALE W@ 64 < NOT AND IF
    GET.WINDOW +HBAR @ 0 QUAD.SCROLL.RANGE SET.CONTROL.RANGE
    GET.WINDOW +VBAR @ 0 QUAD.SCROLL.RANGE SET.CONTROL.RANGE
    QUAD>SCROLL
  ELSE
    GET.WINDOW +HBAR @ 0 0 SET.CONTROL.RANGE
    GET.WINDOW +VBAR @ 0 0 SET.CONTROL.RANGE
  THEN
  WORLD.OUTPUT SHOW.CONTROLS ;

  FIND SET.QUAD.SCROLL ' QUAD.SCROLL.INIT !

  : UPDATE.QSCROLL.ACTION              \ updates world position from scroll settings
  SAVE.CLIP >R
  CURRENT.QUAD @ CLIP.RECT
  TRACE.PICT
  POLAR? @ OR
  CURRENT.QUAD @ WIRE.QUAD = OR IF
    SCROLL>QUAD
    REFRESH.THE.QUAD
  ELSE
    DRAW.ANY.QUAD
    SCROLL>QUAD
    DRAW.ANY.QUAD
```

```
THEN
RULERS? IF
  DRAW.RULERS
  0 TO last.quad
THEN
15 HOLDING
R> RESTORE.CLIP ;                \ display cursor


: INC.VQSCROLL                   \ increment the scroll n --
THE.INTY Ymeasure.units> *
@VPOS + 0 MAX QUAD.SCROLL.RANGE MIN !VPOS
  LAST.PART UPDATE.CONTROL
  UPDATE.QSCROLL.ACTION
  0 UPDATE.CONTROL ;

: INC.HQSCROLL
THE.INTX Xmeasure.units> *       \ increment the scroll n --
  @HPOS + 0 MAX QUAD.SCROLL.RANGE MIN !HPOS
  LAST.PART UPDATE.CONTROL
  UPDATE.QSCROLL.ACTION
  0 UPDATE.CONTROL ;

 : DO.VQSCROLL                   \ continued scrolling by n --
  BEGIN
     MOUSE.BUTTON WHILE
     DUP INC.VQSCROLL
  REPEAT DROP ;


 : DO.HQSCROLL                   \ continued scrolling by n --
  BEGIN
     MOUSE.BUTTON WHILE
     DUP INC.HQSCROLL
  REPEAT DROP ;

 : DO.QSCROLL                    \ scroll.type , increment -- does it
   SWAP
   CASE
     SCROLL.UP/DOWN    OF DO.VQSCROLL ENDOF
     SCROLL.LEFT/RIGHT OF DO.HQSCROLL ENDOF
   ENDCASE ;


 : DO.QTHUMB
   FOLLOW.MOUSE DROP
   GET.WINDOW
   SHOW.CONTROLS
 CASE
     SCROLL.UP/DOWN    OF
      UPDATE.QSCROLL.ACTION ENDOF
     SCROLL.LEFT/RIGHT OF
      UPDATE.QSCROLL.ACTION ENDOF
   ENDCASE ;


 : HANDLE.QSCROLL
 NICE.GRID
 CASE
       IN.THUMB    OF      DO.QTHUMB  ENDOF
       UP.BUTTON   OF -1  DO.QSCROLL ENDOF
       DOWN.BUTTON OF  1  DO.QSCROLL ENDOF
   PAGE.UP      OF -1  DO.QSCROLL ENDOF
```

```
      PAGE.DOWN    OF  1  DO.QSCROLL ENDOF
   ENDCASE  ;


: DO.Q.CONTROLS
  IN.SCROLL.BAR? IF
      HANDLE.QSCROLL
THEN ;


FIND DO.Q.CONTROLS ' DO.QUAD.SCROLL !
```

```
ANEW NEDGE

CR
." Loading new edge utils..."

  CREATE COLOR.EDGE 0 ,

  : SET.COLOR.EDGE
    monochrome? if
      254 COLOR.EDGE !
    else
      key.color.res @ 1-  COLOR.EDGE !
    then ;

   CODE EDGE.8  ( 'X 'Y  X  Y   )
      XSAVE.REGS
    COLOR.EDGE A4 )#MOVE,
    A4 () D4 LONG MOVE,
      02 SP@, D6 LONG MOVE,
    ZBUFFERX>D7,
    BEGIN,   SP ()  D5 LONG MOVE,
       SET.XY>ZBUFF,
       SET.DOT
       D7 D3 LONG MOVE,
       D3 Z.SHIFT # LONG ASL,
       D3 LONG NEG,
            BEGIN,
          Z.RECORD 2/ A0 I) D0 Z.SIZE, MOVE,
          D3 Z.RECORD 2/ WORD A0 @I) D0 Z.SIZE, CMP,
          NE IF,
            A1 () D2 BYTE MOVE,
            D4 D2 BYTE OR,
            D2 A1 () BYTE MOVE,
          ELSE,
            Z.RECORD 2/ 3 *  A0 I) D0 Z.SIZE, CMP,
            NE IF,
              A1 () D2 BYTE MOVE,
              D4 D2 BYTE OR,
              D2 A1 () BYTE MOVE,
            THEN,
          THEN,
         DEC.Y.DOT.8
         DEC.Y.ZB
               D5 1 LONG SUBQ,
             3 SP@,  D5 LONG CMP, LE UNTIL,
           D6 1 LONG SUBQ,
           4 SP@,  D6 LONG CMP,
       LE UNTIL,
      XRESTORE.REGS  NEXT END-CODE

 : EDGE.RECT          \ X Y X Y
   SET.COLOR.EDGE
   EDGE.8 ;

CODE EDGE.SHADE.RECT  ( 'X 'Y  X  Y   )
```

```
  SAVE.REGS
LINE.PAT A0 )#MOVE,
A0 () D4 LONG MOVE,
02 SP@, D6 LONG MOVE,
ZBUFFERX>D7,
BEGIN,   SP ()  D5 LONG MOVE,
   SET.XY>ZBUFF,
   SET.DOT
   D7 D3 LONG MOVE,
   D3 Z.SHIFT # LONG ASL,
       OBJECT.ID A2 )#MOVE,
        BEGIN,
    0 D0 MOVEQ,
    0 D1 MOVEQ,
    Z.RECORD 2/ A0 I) D0 Z.SIZE, MOVE,
    A2 () D0 LONG CMP, EQ IF,
        A0 () D0 Z.SIZE, MOVE,
      D3 0 WORD A0 @I) D1 Z.SIZE, MOVE,
      D1 2Z.SIZE, EXT,
      D1 2Z.SIZE.RANGE 2Z.SIZE, ADDI,
      D0 2Z.SIZE, EXT,
      D0 2Z.SIZE.RANGE 2Z.SIZE, ADDI,
      D0 D1 2Z.SIZE, SUB,
      D1 1 2Z.SIZE, CMPI,
      PL IF,
        D4 A1 () BYTE MOVE,
      ELSE,
        0 D2 MOVEQ,
        D2 A1 () BYTE MOVE,
      THEN,
      0 D1 MOVEQ,
      Z.RECORD A0 I) D1 Z.SIZE, MOVE,
      D0 D1 Z.SIZE, SUB,
      D1 1 2Z.SIZE, CMPI,
      PL IF,
        D4 A1 () BYTE MOVE,
      THEN,
     THEN,
     DEC.Y.DOT.8
     DEC.Y.ZB
          D5 1 LONG SUBQ,
         3 SP@,  D5 LONG CMP, LE UNTIL,
       D6 1 LONG SUBQ,
       4 SP@,  D6 LONG CMP,
    LE UNTIL,
   RESTORE.REGS  NEXT END-CODE


CODE DEPTH.EDGE.RECT  ( 'X 'Y  X  Y   )
   SAVE.REGS
   02 SP@, D6 LONG MOVE,
 ZBUFFERX>D7,
 BEGIN,   SP ()  D5 LONG MOVE,
    SET.XY>ZBUFF,
    SET.DOT
    D7 D3 LONG MOVE,
    D3 Z.SHIFT # LONG ASL,
        BEGIN,
      0 D0 MOVEQ,
      0 D1 MOVEQ,
         A0 () D0 Z.SIZE, MOVE,
      D3 0 WORD A0 @I) D1 Z.SIZE, MOVE,
      D1 2Z.SIZE, EXT,
```

```
        D1 2Z.SIZE.RANGE 2Z.SIZE, ADDI,
        D0 2Z.SIZE, EXT,
        D0 2Z.SIZE.RANGE 2Z.SIZE, ADDI,
        D0 D1 2Z.SIZE, SUB,
        D1 3 2Z.SIZE, CMPI,
        PL IF,
          -1 D2 MOVEQ,
          D2 A1 () BYTE MOVE,
        THEN,
        0 D1 MOVEQ,
        Z.RECORD A0 I) D1 Z.SIZE, MOVE,
        D0 D1 Z.SIZE, SUB,
        D1 8 2Z.SIZE, CMPI,
        PL IF,
          -1 D2 MOVEQ,
          D2 A1 () BYTE MOVE,
        THEN,
       DEC.Y.DOT.8
       DEC.Y.ZB
            D5 1 LONG SUBQ,
          3 SP@,  D5 LONG CMP, LE UNTIL,
        D6 1 LONG SUBQ,
        4 SP@,  D6 LONG CMP,
     LE UNTIL,
   RESTORE.REGS  NEXT END-CODE


: PUSH.OBJECT.EDGE
  POLY.CLIP
  DEPTH.EDGE.RECT
  2DROP 2DROP ;


 : (EDGE.OBJECT)
  POLY.CLIP
  EDGE.RECT
    2DROP 2DROP  ;

 : (EDGE.OBJECTS)
 CURRENT.OBJECT @ >R
 WORLD.OBJECT SET.CURRENT.OBJECT
 SET.TREE.BOUNDS
 BOUNDS.RECT @RECT
 (EDGE.OBJECT)
 R> SET.CURRENT.OBJECT ;


 : EDGE.SHADE.OBJECT
    POLY.CLIP
   EDGE.SHADE.RECT
    2DROP 2DROP  ;


 : EDGE.SHADE
CURRENT.OBJECT @ >R
 WORLD.OBJECT SET.CURRENT.OBJECT
 SET.TREE.BOUNDS
 BOUNDS.RECT @RECT
 EDGE.SHADE.OBJECT
 R> SET.CURRENT.OBJECT ;

 : PUSH.EDGE
CURRENT.OBJECT @ >R
```

```
   WORLD.OBJECT SET.CURRENT.OBJECT
   SET.TREE.BOUNDS
   BOUNDS.RECT @RECT
   PUSH.OBJECT.EDGE
   R> SET.CURRENT.OBJECT ;

HEX
  FF constant EOR.MASK
DECIMAL

 CODE HILITE.RECT8  ( 'X 'Y  X  Y   )
      SAVE.REGS
      02 SP@, D6 LONG MOVE,
    ZBUFFERX>D7,
    BEGIN,   SP ()  D5 LONG MOVE,
       SET.XY>ZBUFF,
       SET.DOT
       OBJECT.ID A2 )#MOVE,
      A2 () D3 LONG MOVE,
            BEGIN,
          Z.RECORD 2/ A0 I) D3 Z.SIZE, CMP,
          EQ IF,
            EOR.MASK D0 MOVEQ,
            A1 () D0 BYTE EOR,
          THEN,
          DEC.Y.DOT.8
          DEC.Y.DOT.8
          DEC.Y.ZB
          DEC.Y.ZB
               D5 2 LONG SUBQ,
             3 SP@,  D5 LONG CMP, LE UNTIL,
           D6 2 LONG SUBQ,
           4 SP@,  D6 LONG CMP,
       LE UNTIL,
      RESTORE.REGS  NEXT END-CODE


  : EVEN  DUP 1 AND IF 1+ THEN ;
  : ODD   DUP 1 AND NOT IF 1+ THEN ;


    : HILITE.RECT       ( X Y X Y )        ( ROUTINE FINDS OBJECT ITSELF
    EVEN SWAP EVEN SWAP
    HILITE.RECT8 ;


   ( D6=XLOOP, D5=YLOOP , D4= LAST.EDGE , D3 = THIS.EDGE )
  (  AO IS ZBUFFER   D2 IS BIT TO SET )


   : WINCLIP
     WINYMIN @ + WINYMIN @ MAX WINYMAX @ MIN SWAP
     WINXMIN @ + WINXMIN @ MAX WINXMAX @ MIN SWAP 2SWAP
     WINYMIN @ + WINYMIN @ MAX WINYMAX @ MIN SWAP
     WINXMIN @ + WINXMIN @ MAX WINXMAX @ MIN SWAP 2SWAP ;
```

```
\ Edit Menu

CR
." Loading Edit Menu..."

anew Edit.Menu.Stuff


 : (EDIT.MENU)
  0
  19 204 ResString       \ " Edit"
  3 new.menu
  20 204 ResString       \ " Undo/Z;-(;Cut/X;Copy/C;Paste/V;Clear"
  3 append.items
    da.edit.menu ;

find (EDIT.MENU) ' EDIT.MENU W!
find (;) ' EDIT.MENU 2+ W!


 : EDIT.MENU.OFF
   19 7 DO
    7 EDIT.MENO DEL.MENU.ITEM
   LOOP ;

 : DO.WORLD.COPY            \ fix to insure no edits outside swivel
  WORLD.OUTPUT FRONT.WINDOW = IF
    IN.OBJECT.DRAWING @ CASE
      0 OF COPY.OBJECT.SCRAP ENDOF
      -1 OF COPY.OBJECT.DRAWING ENDOF
      -2 OF COPY.OBJECT.DRAWING ENDOF
    ENDCASE
  ELSE
    10 SYSBEEP
  THEN ;

 : DO.WORLD.PASTE
  WORLD.OUTPUT FRONT.WINDOW = IF
    IN.OBJECT.DRAWING @ CASE
       0 OF PASTE.OBJECT.SCRAP ENDOF
      -1 OF PASTE.OBJECT.DRAWING ENDOF
      -2 OF PASTE.OBJECT.DRAWING ENDOF
    ENDCASE
  ELSE
    10 SYSBEEP
  THEN ;

 : DO.WORLD.CUT
  WORLD.OUTPUT FRONT.WINDOW = IF
      IN.OBJECT.DRAWING @ CASE
      0 OF CUT.OBJECT.SCRAP ENDOF
      -1 OF CUT.OBJECT.DRAWING ENDOF
      -2 OF CUT.OBJECT.DRAWING ENDOF
      ENDCASE
  ELSE
    10 SYSBEEP
  THEN
    ;

 : DO.WORLD.CLEAR
   WORLD.OUTPUT FRONT.WINDOW = IF
    IN.OBJECT.DRAWING @ CASE
      0 OF DELETE.OBJECT ENDOF
      -1 OF DELETE.OBJECT.DRAWING ENDOF
```

```
    -2 OF DELETE.OBJECT.DRAWING ENDOF
  ENDCASE
ELSE
  10 SYSBEEP
THEN
  ;

: paste.background
 "UNDO.PASTE SET.UNDO$
  world.object set.current.object
 MARK.CHANGE
 Paste.to.world
 OBJECT.CHANGED            \ mark as changed
 redraw.object
 display.world ;


: clear.background
 "UNDO.DELETE SET.UNDO$
  world.object set.current.object
 MARK.CHANGE
 ' OBJECT.TYPE @ 10 -
  RESIZE.RES.RECORD if
   NULL.FORM OBJECT.FORM PLACE
   REDRAW.OBJECT
   display.world
 ELSE
   -108 TO ERROR.FLAG
   DO.ERROR.ALERT
 THEN
 OBJECT.CHANGED ;


: EDIT.MENU.ON
 19 7 DO
   7 EDIT.MENO DEL.MENU.ITEM
  LOOP
 0  202 ResString      \  " -(;Duplicate /D;Duplicate Link /L"
    edit.meno APPEND.ITEMS
 1 202 ResString       \    " -(;Paste Command /7;Paste Background /8;Clear Background /9"
    edit.meno APPEND.ITEMS
   2 202 ResString       \ " -(;Find.../F;Info... /6;Inherit.../I;Output Style...;"
    edit.meno APPEND.ITEMS
  8 TRUE edit.meno ITEM.ENABLE
  9 TRUE edit.meno ITEM.ENABLE
 11 TRUE edit.meno ITEM.ENABLE
 12 TRUE edit.meno ITEM.ENABLE
 13 TRUE edit.meno ITEM.ENABLE
 15 TRUE edit.meno ITEM.ENABLE
 16 TRUE edit.meno ITEM.ENABLE
 17 TRUE edit.meno ITEM.ENABLE
 18 TRUE edit.meno ITEM.ENABLE
  EDIT.MENO MENU.SELECTION:
  CASE
       1 OF  UNDO.OBJECT        ENDOF
    3 OF  DO.WORLD.CUT     ENDOF
    4 OF  DO.WORLD.COPY    ENDOF
    5 OF  DO.WORLD.PASTE   ENDOF
        6 OF  DO.WORLD.CLEAR      ENDOF
        8 OF  DUP.TREE            ENDOF
        9 OF  DUP.LINKED.TREE     ENDOF
     11 OF  ^PARSE.SCRAP  EXECUTE ENDOF
     12 OF  Paste.background   ENDOF
     13 OF  Clear.background   ENDOF
```

```
 15 OF  DO.FIND.PANEL     ENDOF
 16 OF  DO.OBJECT.INFO    ENDOF
   17 OF  DO.INHERIT.PANEL   ENDOF
 18 OF  DO.OUTPUT.PANEL     ENDOF
ENDCASE 0 HILITE.MENU THREE.LIST  ;
```

```
\ EFFECTS OPTIONS

cr ." Loading EFFECTS.Panel..."

ANEW EFFECT.DIALOG

    2965 NEW.DIALOG.RECORD

  1 MAKE.ACTIVE.ITEM  EFFECT.OK
  2 MAKE.CHECK.ITEM   EFFECT.SHADOW
  3 MAKE.CHECK.ITEM   EFFECT.ALIAS
  4 MAKE.CHECK.ITEM   EFFECT.PROJECT
  5 MAKE.CHECK.ITEM   EFFECT.EDGE
  6 MAKE.CHECK.ITEM   EFFECT.EEDGE
  7 MAKE.CHECK.ITEM   EFFECT.PROPICT

  NAME.DIALOG.RECORD EFFECT.PANEL


  : SET.EFFECT.PANEL
    EFFECT.BITS @ OPTION.EDGE.BIT AND IF
       1 EFFECT.EDGE !
    ELSE
       0 EFFECT.EDGE !
    THEN
    EFFECT.BITS @ OPTION.SHADOW.BIT AND IF
       1 EFFECT.SHADOW !
    ELSE
      0 EFFECT.SHADOW !
    THEN
    EFFECT.BITS @ OPTION.PROJECT.BIT AND IF
       1 EFFECT.PROJECT !
    ELSE
      0 EFFECT.PROJECT !
    THEN
    EFFECT.BITS @ OPTION.ALIAS.BIT AND IF
       1 EFFECT.ALIAS !
    ELSE
      0 EFFECT.ALIAS !
    THEN
    EFFECT.BITS @ OPTION.EEDGE.BIT AND IF
       1 EFFECT.EEDGE !
    ELSE
       0 EFFECT.EEDGE !
    THEN
    EFFECT.BITS @ OPTION.PROPICT.BIT AND IF
       1 EFFECT.PROPICT !
    ELSE
       0 EFFECT.PROPICT !
    THEN  ;


  : GET.EFFECT.PANEL
    0 EFFECT.BITS !
    EFFECT.EDGE @ IF
      EFFECT.BITS @
      OPTION.EDGE.BIT +
      EFFECT.BITS !
    THEN
    EFFECT.SHADOW @ IF
      EFFECT.BITS @
      OPTION.SHADOW.BIT +
      EFFECT.BITS !
```

```
THEN
EFFECT.PROJECT @ IF
  EFFECT.BITS @
  OPTION.PROJECT.BIT +
  EFFECT.BITS !
THEN
EFFECT.ALIAS @ IF
  EFFECT.BITS @
  OPTION.ALIAS.BIT +
  EFFECT.BITS !
THEN
EFFECT.EEDGE @ IF
  EFFECT.BITS @
  OPTION.EEDGE.BIT +
  EFFECT.BITS !
THEN
EFFECT.PROPICT @ IF
  EFFECT.BITS @
  OPTION.PROPICT.BIT +
  EFFECT.BITS !
THEN
;

: DO.TWEEN.EFFECTS
  SET.EFFECT.PANEL
  EFFECT.PANEL HANDLE.DIALOG
  GET.EFFECT.PANEL ;
```

```
\ EFFECTS RENDER

2 base !
CREATE  OPTION.BITS  0 ,
CREATE  EFFECT.BITS  0 ,
1       CONSTANT OPTION.EDGE.BIT
10      CONSTANT OPTION.SHADOW.BIT
100     CONSTANT OPTION.PROJECT.BIT
1000    CONSTANT OPTION.PAINT.BIT
10000     CONSTANT OPTION.VIEW.BIT
100000    CONSTANT OPTION.FAST.BIT
1000000   CONSTANT OPTION.SCRAP.BIT
10000000  CONSTANT OPTION.PICS.BIT
100000000 CONSTANT OPTION.EEDGE.BIT
1000000000  CONSTANT OPTION.ALIAS.BIT
10000000000 CONSTANT OPTION.PROPICT.BIT
DECIMAL


: (EFFECTS.RENDER)
    EFFECT.BITS @  OPTION.SHADOW.BIT AND
    EXIT.FLAG 0= AND ERROR.FLAG 0= AND IF     \ if shadow bit is on ...
      EFFECT.BITS @  OPTION.EDGE.BIT AND
      EFFECT.BITS @  OPTION.PROPICT.BIT AND OR IF
        SHADE.PIX             \ do shadow and restore
      ELSE
        (SHADE.PIX)             \ just do shadow
      THEN
    else
      REDRAW.OBJECT                  \ draw the tree
    then
    EFFECT.BITS @  OPTION.PROPICT.BIT AND
    EXIT.FLAG 0= AND ERROR.FLAG 0= AND IF     \ if project bit is on ...
      (DRAW.PICT.OBJECTS)
    THEN
    EFFECT.BITS @  OPTION.PROJECT.BIT AND
    EXIT.FLAG 0= AND ERROR.FLAG 0= AND IF     \ if project bit is on ...
      MAP.SHADOW.PIX
    THEN
    EFFECT.BITS @  OPTION.EDGE.BIT AND
    EXIT.FLAG 0= AND ERROR.FLAG 0= AND IF     \ if edge bit is on...
      EDGE.OBJECTS              \ do edging
    THEN
    EFFECT.BITS @  OPTION.EEDGE.BIT AND
    EXIT.FLAG 0= AND ERROR.FLAG 0= AND IF     \ if edge bit is on...
      EDGE.ENHANCE              \ do edging
    THEN  ;

decimal
```

```
\ routines to write EPS files

    ANEW --EPS.2--

    501 MakeSwapOver CREATE.EPS.FILE

    StartSwapOver

    global EPS.FILE
    GLOBAL EPS.POINTER
    10 CONSTANT POST.SCALE

    create 'cr  1 c, 13 c,
    create 'sp  1 c, 32 c,


   : +PostString
       scratch.string SWAP +PHRASE ;

   : OPEN.EPS.RES
       TEMP.REF#  VOLREF# !                       \ set io one shots
       IODIR OFF
       0 TEMP.REF# SETVOL                         \ set volume
       REPLY 10+ CREATE.RES.FILE                  \ create a resource fo
       ASCII TEXT                                 \ set default type
       DFLT.FILE.TYPE !
       IODIR OFF
       TEMP.REF#  VOLREF# !                       \ set io one shots
       0 TEMP.REF#  SETVOL                        \ set volume
       REPLY 10+
       OPEN.RES.FILE TO EPS.FILE
       POST.RES.ERROR?
       EPS.FILE 1 < IF
           0 TO EPS.FILE
       THEN  ;

    : CLOSE.EPS.RES
       UPDATE.RESOURCES                              \ update the resou
       EPS.FILE 0> IF
           UPDATE.RESOURCES
           EPS.FILE CLOSE.RES.FILE
           0 TO EPS.FILE
       THEN ;

    : WRITE.EPS.PICT                   \ writes pict for world into EPS doc
       0 LOCALS| C.PICT |
       ENCODE.SWIV? @ >R               \ save encode and procedural state
       PROCEDURAL?  @ >R
       ENCODE.SWIV? OFF
       PROCEDURAL? ON
       MAKE.OBJECT.PICT TO C.PICT
       R> PROCEDURAL? !
       R> ENCODE.SWIV? !
       WORLD.OBJECT SET.CURRENT.OBJECT
       C.PICT HANDLE.SIZE 0> IF
           OPEN.EPS.RES
           EPS.FILE 0 > IF
               C.PICT "PICT 256
               NIL.NAME ADD.RESOURCE
               C.PICT WRITE.RESOURCE
           THEN
           CLOSE.EPS.RES
       ELSE 10 SYSBEEP THEN  ;
```

```
: NEW.EPS.FILE                                                    \ -- SETS EPS.
    0 203 ResString              \ " .eps"
    APPEND.TITLE
    1 203 ResString              \ " EPS File "
    ASCII TEXT                                                    \ set default
    NEW.TEMP.FILE TO EPS.FILE
    0 TO EPS.POINTER  ;


: EPS.STRING
    LOCALS| THE.STRING |
    ERROR.FLAG 0= IF
    THE.STRING 1+ THE.STRING C@ EPS.POINTER EPS.FILE WRITE.VIRTUAL
    THE.STRING C@ EPS.POINTER + TO EPS.POINTER
    IO-RESULT @ TO ERROR.FLAG
    THEN ;

: enter.eps.line
    scratch.string +STRING
    'cr scratch.string +STRING
    scratch.string EPS.STRING
    scratch.string 255 erase  ;


: DO.EPS.BOUNDS
    " %%BoundingBox: " scratch.string +STRING
    WORLD.OBJECT SET.CURRENT.OBJECT
    SET.TREE.BOUNDS                                     \ set the tree bounds
     BOUNDS.RECT W@     EXT NUMBER>$ +PostString
    'sp scratch.string +STRING
     BOUNDS.RECT 2+ W@ EXT NUMBER>$ +PostString
    'sp scratch.string  +STRING
     BOUNDS.RECT 4+ W@ EXT NUMBER>$ +PostString
    'sp scratch.string +STRING
    BOUNDS.RECT  6+ W@ EXT NUMBER>$ +PostString
    'cr scratch.string +STRING
        scratch.string EPS.STRING
     scratch.string 255 erase ;


: WRITE.EPS.HEADER
   scratch.string 255 erase
    " %!PS-Adobe-2.0 EPSF-1.2"
    enter.eps.line
    " %%DocumentProcSets:Adobe_Illustrator_1.1 0 0"
    enter.eps.line
    DO.EPS.BOUNDS
    " %%Creator: Swivel 3D Version 1.1"
    enter.eps.line
    " %%Title: "  scratch.string +STRING
        REPLY 10+
    enter.eps.line
    " %%EndComments"
    enter.eps.line
    " %%EndProlog"
    enter.eps.line
    " %%BeginSetup"
    enter.eps.line
    " Adobe_Illustrator_1.1 begin"
    enter.eps.line
    " n"
```

```
    enter.eps.line
    " %%EndSetup"
    enter.eps.line  ;

: EPS.TRAILER
    scratch.string 255 erase
    " %%Trailer" scratch.string +STRING
    'cr scratch.string +STRING
    'cr scratch.string +STRING
        scratch.string EPS.STRING ;

:   POSTFIX>$
    PAD 32 ERASE
    0 PAD !
    PAD
    SWAP
        DECIMAL.SCALE
        POST.SCALE */
    SWAP
    MEASURE>MEASURE$!
    PAD 1+ PAD C@ ;

: EPS.line.to
    locals| the.X the.Y |
    scratch.string 255 erase
    The.y POSTFIX>$      +PostString          \ use with NUMBER>$, takes a c
    'sp             scratch.string +STRING
    7200 the.x - POSTFIX>$  +PostString
    "  l"           scratch.string +STRING
    'cr             scratch.string +STRING
    scratch.string EPS.STRING ;

: EPS.move.to
    locals| the.X the.Y |
    scratch.string 255 erase
    the.y  POSTFIX>$     +PostString          \ use with NUMBER>$, takes a c
    'sp             scratch.string +STRING
    7200 the.X - POSTFIX>$   +PostString
    "  m"           scratch.string +STRING
    'cr             scratch.string +STRING
    scratch.string EPS.STRING ;

: EPS.OUTLINE
    scratch.string 255 erase
    " 0 g"  scratch.string +STRING
    'cr    scratch.string +STRING
    scratch.string EPS.STRING ;

: EPS.white.fill
    scratch.string 255 erase
    " 1 g"  scratch.string +STRING
    'cr    scratch.string +STRING
    scratch.string EPS.STRING ;

: EPS.COLOR
    THIS.POLY +RED.RGB  @RGB                \ make and rgb pattern
    locals| the.blue the.green the.red |
    scratch.string 255 erase
```

```
   " 0"            scratch.string +STRING
   the.red 1000 color.scale */ 1000 swap -
   PAD CLEAR.STRING MEASURE>MEASURE$!
   PAD scratch.string +STRING
   "  0"           scratch.string +STRING
   the.green 1000 color.scale */ 1000 swap -
   PAD CLEAR.STRING MEASURE>MEASURE$!
   PAD scratch.string +STRING
   "  0"           scratch.string +STRING
   the.blue 1000 color.scale */ 1000 swap -
   PAD CLEAR.STRING MEASURE>MEASURE$!
   PAD scratch.string +STRING
   "  0 k"         scratch.string +STRING
   'cr             scratch.string +STRING
   scratch.string EPS.STRING ;


: EPS.FILL
   scratch.string 255 erase
   " F"  scratch.string +STRING
   'cr    scratch.string +STRING
   'cr    scratch.string +STRING
   scratch.string EPS.STRING ;

: EPS.FILL/FRAME
   scratch.string 255 erase
   " B"  scratch.string +STRING
   'cr    scratch.string +STRING
   'cr    scratch.string +STRING
   scratch.string EPS.STRING ;

: EPS.FRAME
   scratch.string 255 erase
   " S"  scratch.string +STRING
   'cr    scratch.string +STRING
   'cr    scratch.string +STRING
   scratch.string EPS.STRING
   ;


: WRITE.EPS.Poly                                  \ writes the current poly out
   0 LOCALS| C.POLY |
   THIS.POLY THE.POINTS @  0 = NOT IF
   THIS.POLY THE.POINTS @
   @ POINT>XY   EPS.move.to
   THIS.POLY #THE.POINTS @ 1 DO
       THIS.POLY THE.POINTS @
       I 4* + @ POINT>XY  EPS.line.to
   LOOP
   THIS.POLY THE.POINTS @
   @ POINT>XY  EPS.line.to
   THEN ;                                         \ dispose of the poly


: EPS.RENDER                                      \ renders the poly according t
   THIS.POLY +R.MODE W@
   CASE
       WIREFRAME   OF
           EPS.Outline ENDOF                      \ wireframe is just frame the
       HIDDENLINE  OF
           EPS.white.fill  ENDOF
       SHADEDLINE  OF
           EPS.COLOR ENDOF
```

```
        SHADED OF
            EPS.COLOR ENDOF                    \ shade is just shaded poly
        Phong   OF
            EPS.COLOR ENDOF
    ENDCASE
        WRITE.EPS.Poly
    THIS.POLY +R.MODE W@
    CASE
        WIREFRAME   OF
            EPS.FRAME ENDOF                    \ wireframe is just frame the
        HIDDENLINE  OF
            EPS.FILL/FRAME  ENDOF
        SHADEDLINE  OF
            EPS.FILL/FRAME ENDOF
        SHADED OF
            EPS.fill ENDOF                     \ shade is just shaded poly
        Phong   OF
             EPS.fill ENDOF
    ENDCASE ;


  : WRITE.EPS.POLYS                            \ writes all the polys in the
    POLY.COUNT  0 DO
        I SET.CURRENT.POLY
        0 ?HEAP.SIZE MINHEAPSIZE > IF          \ check for room in heap
            EPS.RENDER
        ELSE -1 SCRAP.FLAG !
        THEN
    LOOP ;

: WRITE.EPS.FILE                               \ draws the tree with the tool

    WATCH SET.CURSOR
    GLOBAL.RENDER @ TO POLY.GLOBAL.RENDER
    ALT.POLY @
    0 0 0 LOCALS| MEM.RESULT POLY.HANDLE POLY.HUNKS C.ALT |
    72 POST.SCALE * ' TBoxVertRes !
    72 POST.SCALE * ' TBoxHorizRes !
    -1 GLOBAL.RENDER !
    ^WRITE.POLY.RECORD ALT.POLY !
    NUMBER.TREE.POLYS
    POLY.COUNT 2 + POLY.RECORD * 2*
    NEW.CLEAR.HANDLE TO MEM.RESULT
    TO POLY.HANDLE
    MEM.RESULT 0= IF
        POLY.COUNT 2 + 16 *
        NEW.CLEAR.HANDLE  TO MEM.RESULT
        TO POLY.HUNKS
        MEM.RESULT 0= IF
            POLY.HANDLE @ TO POLY.ARRAY
            POLY.ARRAY POLY.COUNT 2 + POLY.RECORD * +
            TO TEMP.POLY.ARRAY
            POLY.HANDLE LOCK.HANDLE
            POLY.HUNKS @ TO POLY.HUNK.LIST
            POLY.HUNKS LOCK.HANDLE
            0 TO HUNK.POINTER
            0 SET.CURRENT.POLY
            0 TO POLY.COUNT
            DRAW.TREE
            WATCH SET.CURSOR
            SORT.POLYS
```

```
            WRITE.EPS.POLYS
            C.ALT ALT.POLY !
            POLY.HUNKS UNLOCK.HANDLE
            POLY.HUNKS TO.HEAP
        ELSE
            10 SYSBEEP
            MEM.RESULT TO ERROR.FLAG
        THEN
        POLY.HANDLE UNLOCK.HANDLE
        POLY.HANDLE TO.HEAP
    ELSE
         10 SYSBEEP
         MEM.RESULT TO ERROR.FLAG
    THEN
    C.ALT ALT.POLY !
    POLY.GLOBAL.RENDER GLOBAL.RENDER !
    72 ' TBoxVertRes !
    72 ' TBoxHorizRes !
    INIT.CURSOR  ;


: (CREATE.EPS.FILE)
    NEW.EPS.FILE
    EPS.FILE IF
        WRITE.EPS.HEADER
        WRITE.EPS.FILE
        EPS.TRAILER
        EPS.FILE CLOSE
        OPEN.EPS.RES
        WRITE.EPS.PICT
        CLOSE.EPS.RES
    THEN ;

SetSwapOverToken
EndSwapOver
```

```
\ file menu

cr ." Loading File Menu..."

 : INIT.FILES
   0
   3 202 ResString        \ " File"
   FILE.MENO NEW.MENU
   4 202 ResString        \ " New/N;Open/O;Open Command File;-(;Close;Save/S;Save As;Export File.../U ;Reve
   FILE.MENO APPEND.ITEMS
   5 202 ResString        \ " Halftone...;Page Setup...;Print.../P;-(;Quit/Q"
   FILE.MENO APPEND.ITEMS   ;


( FILE.MENU.SELECT )                           ( 101686 YH )

 : FILE.MENU.OFF
    3 FALSE FILE.MENO ITEM.ENABLE
    4 FALSE FILE.MENO ITEM.ENABLE
    5 FALSE FILE.MENO ITEM.ENABLE
    6 FALSE FILE.MENO ITEM.ENABLE
    7 FALSE FILE.MENO ITEM.ENABLE
    8 FALSE FILE.MENO ITEM.ENABLE
    9 FALSE FILE.MENO ITEM.ENABLE
   10 FALSE FILE.MENO ITEM.ENABLE
   11 FALSE FILE.MENO ITEM.ENABLE
     12 FALSE FILE.MENO ITEM.ENABLE
   13 FALSE FILE.MENO ITEM.ENABLE   ;


 : FILE.MENU.ON
    3 TRUE FILE.MENO ITEM.ENABLE
    5 TRUE FILE.MENO ITEM.ENABLE
    6 TRUE FILE.MENO ITEM.ENABLE
    7 TRUE FILE.MENO ITEM.ENABLE
    8 TRUE FILE.MENO ITEM.ENABLE
    9 TRUE FILE.MENO ITEM.ENABLE
   11 TRUE FILE.MENO ITEM.ENABLE
     12 TRUE FILE.MENO ITEM.ENABLE
   13 TRUE FILE.MENO ITEM.ENABLE   ;


: REVERT.WORLD
   REVERT.ALERT CAUTION.ALERT
   IALERT @ 1 = IF
    CURRENT.FILE.NAME C@ 0 = NOT IF          \ if not a nil file name
      GET.WORLD
      -1 TO LAST.OUTPUT.WINDOW
      SCRATCH.TOKEN @ EXECUTE
      CHECKIN.WORLD
    THEN
  THEN  ;


  : SETUP.FILE.MENU
    WORLD.OUTPUT FRONT.WINDOW =
    in.object.drawing @ 0 = AND
     IF
      CHECKOUT.WORLD IF
        6 TRUE FILE.MENO ITEM.ENABLE
        CURRENT.FILE.NAME C@ 0 = IF
```

```
      9 FALSE FILE.MENO ITEM.ENABLE
    ELSE
      9 TRUE FILE.MENO ITEM.ENABLE
    THEN
  ELSE
    6 FALSE FILE.MENO ITEM.ENABLE
    9 FALSE FILE.MENO ITEM.ENABLE
  THEN
THEN ;


64000 CONSTANT MINFILE.SIZE


: FILE.MEMORY.NEEDED
 zbufferx @  8 /  OUTPUT.DEPTH @ * ZBUFFERY @ *
 MINFILE.SIZE +
 0 ?HEAP.SIZE > IF
   2  201 ResString      \ " There is not enough memory to open a new file. "
   "" "" "" 401 issuealert
   0
 else
   -1
 then ;


: Output.Window.Needed
   CURRENT.OUTPUT.WINDOW
     0 LOCALS| THE.FLAG THE.WIN
   0 TO CURRENT.OUTPUT.WINDOW
   BEGIN
     WORLD.OUTPUT
     ?ACTIVE.WPTR NOT IF
       -1 TO THE.FLAG
     THEN                    \ TRUE IF NOT ACTIVE
     CURRENT.OUTPUT.WINDOW
     1+ TO CURRENT.OUTPUT.WINDOW
     CURRENT.OUTPUT.WINDOW #WINDOWS =
   UNTIL
   THE.WIN TO CURRENT.OUTPUT.WINDOW
   THE.FLAG NOT IF
     3  201 ResString      \ " Please close a document before opening a new one. "
     "" "" "" 401 issuealert
   THEN
   THE.FLAG  ;


: FILE.MENU.SELECT
  FILE.MENO  MENU.SELECTION:
  CASE
   1 OF  in.object.drawing @ if
       PUT.OBJECT.DRAWING
       0 IN.OBJECT.DRAWING !
       then
       WORLD.OUTPUT ?ACTIVE.WPTR IF
         WORLD.OBJECT SET.CURRENT.OBJECT
         THEN
       FILE.MEMORY.NEEDED
       OUTPUT.WINDOW.NEEDED AND IF
        CHECK.NEW.WORLD
       THEN
     ENDOF
   2 OF  in.object.drawing @ if
```

```
    PUT.OBJECT.DRAWING
    0 IN.OBJECT.DRAWING !
    then
    WORLD.OUTPUT ?ACTIVE.WPTR IF
      WORLD.OBJECT SET.CURRENT.OBJECT
      THEN
    FILE.MEMORY.NEEDED
    OUTPUT.WINDOW.NEEDED AND IF
    OPEN.WORLD
    THEN
  ENDOF
3 OF  PARSE.COMMAND.FILE ENDOF
    5 OF  CLOSE.WORLD        ENDOF
6 OF  SAVE.WORLD         ENDOF
7 OF  SAVE.AS.WORLD      ENDOF
8 OF  WriteOutput        ENDOF
    9 OF  REVERT.WORLD       ENDOF
 11 OF  DO.HALF.PANEL     ENDOF
 12 OF  DO.PAGE.SETUP        ENDOF
   13 OF  DO.PRINT             ENDOF
   15 OF  in.object.drawing @ if
    PUT.OBJECT.DRAWING
    0 IN.OBJECT.DRAWING !
    then
   EXIT.WORLD     ENDOF
ENDCASE 0 HILITE.MENU
WORLD.OBJECT SET.CURRENT.OBJECT ;
```

```
\ file utils for swivel
\ These routines implement save, saveas, close, and revert for Swivel Files
\ Swivel objects are resources in the res ource fork of a file


CR ." Loading Res File Utilities..."

\ token to close all collateral windows

 0 constant ^Close.edit.windows

\ allocate reply buffer
  find reply not
  iftrue create REPLY 74 allot ifend

\ constants for file handling
  ASCII SMDL CONSTANT DEFAULT.RES.FILE
  ASCII SMDS CONSTANT DEFAULT.SCRATCH.FILE

\ string variables
  VARIABLE SCRATCH.STRING 255 ALLOT
  2 203  CreateResString "INDRAWING      \ "  . Object Drawing"
  3 203  CreateResString  "INWORLD     \ "  . World"
  4 203  CreateResString  "UNTITLED    \ " Untitled"
  5 203  CreateResString  SAVE.PROMPT    \ " Save Changes to  "

  Create 'DEFAULT.FILE  DEFAULT.RES.FILE ,

\ window creation token
  CREATE NEW.WINDOW.TOKEN  NULL.TOKEN ,

\ constants to check the stack

  HEX
    0908 WCONSTANT CURSTACKBASE
    0130 WCONSTANT APPLLIMIT
    0322 WCONSTANT DEFLTSTACK
  DECIMAL

   -100 constant SCRAP.TOO.BIG

\ NEW SETVOL

HEX
  CODE (SETVOL)             \ low level volume set
    A0 POP,
    A015 W,
  NEXT END-CODE


DECIMAL


  : SETVOL             \ NAME, REFNUM -- RESULT
    SCRATCH.STRING 255 ERASE
    SCRATCH.STRING 22 + W!
    SCRATCH.STRING 18 + !
    SCRATCH.STRING (SETVOL)
    \ SCRATCH.STRING 16 + W@     \ set result
    \ TO ERROR.FLAG
    ;


\ scrap checking routine
```

```
: MAX.SCRAP
    CURSTACKBASE @ APPLLIMIT @ -
    DEFLTSTACK @ MIN ;

: SCRAPSAFE?
    SCRAP.HANDLE @ HANDLE.SIZE MAX.SCRAP >
    IF
    SCRAP.TOO.BIG
    to ERROR.FLAG
    DO.ERROR.ALERT
    ZERO.SCRAP DROP
    THEN ;


\ file error routines

 : POST.FILE.ERROR?            \ posts error for file handling
  IO-RESULT @ ?dup IF
    TO ERROR.FLAG
  THEN
  DO.ERROR.ALERT ;

 : POST.RES.ERROR?             \ posts error fo resource handling
  RES.ERROR ?dup IF
    TO ERROR.FLAG
  THEN
  DO.ERROR.ALERT  ;


\ swivel version of update resource

: UPDATE.RESOURCES             \ updates resources and posts error if there is one
  CUR.RES.FILE
  UPDATE.RES.FILE
  POST.RES.ERROR? ;


\ multiple record file handling

: LOAD.ALL.RECORDS
  LOAD.ENVIR
  LOAD.PALETTES
  LOAD.RECORDS   ;

: DELETE.ALL.RECORDS
  DELETE.ENVIR
  DELETE.PALETTES
  DELETE.RECORDS ;

: ATTACH.ALL.RECORDS
  ATTACH.ENVIR
  ATTACH.PALETTES
  ATTACH.RECORDS ;

: DETACH.ALL.RECORDS
  DETACH.ENVIR
  DETACH.PALETTES
  DETACH.RECORDS ;


: Get.All.Records
  LOAD.ALL.RECORDS
  DETACH.ALL.RECORDS
```

```
  get.lights
  get.materials ;

: Put.All.Records
  0 TO ERROR.FLAG              \ clear any objects in transition
  Put.lights
  Put.Materials
  ATTACH.ALL.RECORDS
  CUR.RES.FILE
  UPDATE.RES.FILE
  RES.ERROR ?DUP IF
    TO ERROR.FLAG
  THEN
  DETACH.ALL.RECORDS ;


\ title and string handleing routines

\ sets print dialog title
\ used by laserwriter print dialog as document's title


GLOBAL DLOG.HANDLE 0 TO DLOG.HANDLE

ASCII DLOG CONSTANT "DLOG


: GET.PDIALOG ( --- )
  "DLOG 3000 GET.RESOURCE ?DUP IF -> DLOG.HANDLE THEN ;

: SIZE.HANDLE ( $addr-- )
  >R DLOG.HANDLE 20 R> C@ 1+ + RESIZE.HANDLE ;

: INSTALL.TITLE ( $addr-- )
   DUP C@ DLOG.HANDLE @ 20 + SWAP 1-  CMOVE ;

: SET.D.TITLE ( $addr-- )
  LOCALS| &addr |
  GET.PDIALOG &addr SIZE.HANDLE 0= IF
    &addr INSTALL.TITLE
  THEN  ;


: RELEASE.D.TITLE
  DLOG.HANDLE HANDLE.SIZE 0> IF
    DLOG.HANDLE DETACH.RESOURCE   \ fix LYH
    DLOG.HANDLE TO.HEAP
    0 to DLOG.HANDLE
  THEN ;

AXE GET.PDIALOG AXE INSTALL.TITLE


\ title and string handling

 : OUTPUT.TITLE  ( -- handle )         \ handle to title of current output window
  WORLD.OUTPUT 134 + @   ;

 : SAVE.ALERT                   \ save alert, uses title of current output window
  SAVE.PROMPT dup c@
  PAD swap 1+ cmove
  PAD
```

```
CURRENT.FILE.NAME C@
0 = IF "UNTITLED
  ELSE
    CURRENT.FILE.NAME
  THEN
   " ?" ' C
402 HCENTER.ALERT
402 ISSUEALERT  ;

: ALREADY.OPEN.ALERT
-48 TO ERROR.FLAG
DO.ERROR.ALERT
0 TO ERROR.FLAG ;


: ALREADY.OPEN?                    \ -- boolean  true if file is already in use
 CURRENT.OUTPUT.WINDOW
 CURRENT.FILE.NAME
 RES.FILE.REF# @
 0 LOCALS| MATCH.FLAG C.REF# C.NAME C.WINDOW     \ declare locals
 #WINDOWS 0 DO                    \ loop through number of windows
   I TO CURRENT.OUTPUT.WINDOW          \ set loop count as current
   I C.WINDOW = NOT IF              \ if not the current window...
     WORLD.OUTPUT ?ACTIVE.WPTR IF      \ check if window is active
       C.REF# RES.FILE.REF# @ = IF     \ check if ref# are equal
         C.NAME  CURRENT.FILE.NAME     \ check if titles match
         -STRING NOT IF
           -1 TO MATCH.FLAG       \ if all conditions are true set flag
         THEN
       THEN
     THEN
   THEN
 LOOP                       \ loop till done
 C.WINDOW TO CURRENT.OUTPUT.WINDOW
 MATCH.FLAG ;                    \ leave flag as output


: +STRING
 0 LOCALS| $COUNT $DEST $SOURCE
 254 $DEST C@ -
 $SOURCE C@ MIN TO $COUNT
 $SOURCE 1+
 $DEST $DEST C@ + 1+
 $COUNT CMOVE
 $DEST C@ $COUNT + $DEST C! ;

: +PHRASE
 0 LOCALS| $COUNT $MAX $DEST $SOURCE          \ source.phrase dest.string maxcount --
 BEGIN
   $SOURCE $COUNT + C@ 32 =          \ skips leading spaces
   $COUNT $MAX < AND WHILE
   $COUNT 1+ TO $COUNT
 REPEAT
 BEGIN
   $SOURCE $COUNT + C@ 32 = NOT        \ counts letters in word
   $COUNT $MAX < AND WHILE
   $COUNT 1+ TO $COUNT
 REPEAT
 $COUNT 254 $DEST C@ - MIN TO $COUNT
 $SOURCE
 $DEST $DEST C@ + 1+
 $COUNT CMOVE
 $DEST C@ $COUNT + $DEST C! ;
```

```
: OUTPUT.TITLE                 \ sets title from current.file.name
CURRENT.FILE.NAME                \ check if file name is nil
C@ IF
  CURRENT.FILE.NAME
ELSE
  "UNTITLED                \ else set as untitled
THEN
;

: APPEND.TITLE
LOCALS| THE.STRING |
OUTPUT.TITLE
SCRATCH.STRING
OUTPUT.TITLE C@ 1+ 100 MIN CMOVE
THE.STRING 1+
SCRATCH.STRING C@
SCRATCH.STRING 1+ +
THE.STRING C@ 100 MIN CMOVE
THE.STRING C@
SCRATCH.STRING C@ +
SCRATCH.STRING C!
SCRATCH.STRING ;


: SET.OUTPUT.TITLE              \ sets title from current.file.name
OUTPUT.TITLE
0 SCRATCH.STRING C!
SCRATCH.STRING +STRING
IN.OBJECT.DRAWING @ IF
  " . "
  SCRATCH.STRING +STRING
  OBJECT.STRING
  SCRATCH.STRING SWAP EXT
  +PHRASE
ELSE
  "INWORLD
  SCRATCH.STRING +STRING
THEN
SCRATCH.STRING  WORLD.OUTPUT SET.WTITLE     \ set the window title to the current saved title
OUTPUT.TITLE  SET.D.TITLE
;


CREATE RES.FILE.ID 0 ,


: Check.Scratch.Create              \ makes sure a scratch file is selected
  0 0 0 LOCALS| REF# FILE# N.FILE
 ERROR.FLAG 0= IF
   SCRATCH.REF# @ VOLREF# !          \ set to one shots
   ICDIR OFF
   0 SCRATCH.REF# @ SETVOL           \ set volume
   RW 0 SCRATCH.NAME NEW.FILE         \ open a new file
   TO N.FILE
   POST.FILE.ERROR?
 THEN
 BEGIN
   Error.Flag  0 < while             \ if the volume is locked
     6 203 ResString           ." Please choose another place to put the scratch file..."
     "" "" "" 401 issuealert drop
     REPLY 74 ERASE 75 75 XY>POINT        \ point for screen position of dialog
```

```
      7 203 ResString              \ " Scratch File "
     REPLY 74 ERASE                \ clear reply
    75 75 XY>POINT                 \ screen.position
    7 203 ResString                \ " Scratch File "
    SCRATCH.NAME
    REPLY (PUT.FILE)               \ buffer and call (put.file)
    DISCARD.ACTIVATES  FRONT.WINDOW (WINDOW)    \ put away nicely
    REPLY C@ BOOLEAN                            \ test for response
    IF                    \ if selected file
      REPLY 6+ <W@  SCRATCH.REF# !      \ set local ref#
      SCRATCH.REF# @ VOLREF# !          \ set io one shots
      IODIR OFF
      0 SCRATCH.REF# @ SETVOL           \ set volume
      RW 0 SCRATCH.NAME NEW.FILE TO N.FILE    \ open a new file
      IO-RESULT @ TO ERROR.FLAG
    ELSE
      BYE
    THEN
  REPEAT
  N.FILE ;


: New.Scratch.File
    0 LOCALS| N.FILE |
    0 TO ERROR.FLAG
    Check.Scratch.Create           \ check for locked disk
    TO N.FILE               \ set a new file
    N.FILE 0 > IF
      N.FILE CLOSE
      POST.FILE.ERROR?             \ post error if there is one
      SCRATCH.REF# @ VOLREF# !        \ set io one shots
      IODIR OFF
      0 SCRATCH.REF# @ SETVOL         \ set volume
      SCRATCH.NAME  CREATE.RES.FILE      \ create a resource fork to the file
      POST.RES.ERROR?              \ post error if there is one
      SCRATCH.REF# @ VOLREF# !        \ set io one shots
      IODIR OFF
      0 SCRATCH.REF# @ SETVOL         \ set volume
      SCRATCH.NAME OPEN.RES.FILE TO N.FILE  \ open the new file
      POST.RES.ERROR?              \ post error if there is one
    THEN
    N.FILE 1 <  IF
      BYE                   \ post the error and leave
    THEN
    N.FILE  RES.FILE.ID !
  ;



: OPEN.SCRATCH.FILE              \ open a scratch file
  0 LOCALS| N.FILE |
  0 TO ERROR.FLAG
  DEFAULT.SCRATCH.FILE             \ set default type
  DFLT.FILE.TYPE !
  IODIR OFF
    SCRATCH.REF# @ VOLREF# !          \ set io one shots
  0 SCRATCH.REF# @ SETVOL            \ set volume
  SCRATCH.NAME OPEN.RES.FILE TO N.FILE
  N.FILE 1 < IF
    New.Scratch.File
  ELSE
    N.FILE  RES.FILE.ID !
  THEN ;
```

```
: CLOSE.SCRATCH.FILE                    \ close the scratch file
  RES.FILE.ID @ 0> IF                   \ id and close
    RES.FILE.ID @ CLOSE.RES.FILE
  THEN
  RES.ERROR ?dup IF
    TO ERROR.FLAG
  THEN
  IODIR OFF
  SCRATCH.REF# @ VOLREF# !              \ set io one shots
  0 SCRATCH.REF# @ SETVOL               \ set volume
  SCRATCH.NAME DELETE$                  \ delete the file
  POST.FILE.ERROR?                      \ post error if there is one
  ;

: CLEAR.SCRATCH.FILE                    \ clear a file if there is one
  SCRATCH.REF# @ VOLREF# !              \ set io one shots
  IODIR OFF
  SCRATCH.NAME DELETE$  ;               \ delete the file

: (TEMP.CLOSE.SCRATCH)
  0 TO ERROR.FLAG
  RESET.UNDO
  CLEAR.MOVING
  BEGIN
    CLOSE.SCRATCH.FILE
    NEW.SCRATCH.FILE
    PUT.ALL.RECORDS                     \ write out the records
    RES.FILE.ID @ 0> IF
      RES.FILE.ID @ CLOSE.RES.FILE      \ close the current file
      THEN
    ERROR.FLAG 0 =                      \ loop until no error...
  UNTIL ;

: TEMP.CLOSE.SCRATCH.FILE               \ close the scratch file
  (TEMP.CLOSE.SCRATCH)                  \ close and post error if there is one
  DELETE.ALL.RECORDS                    \ delete the records
  ;

: PUT.NEW.SCRATCH
  0 TO ERROR.FLAG
  BEGIN
    PUT.ALL.RECORDS                     \ attach the records
  ERROR.FLAG IF
    CLOSE.SCRATCH.FILE
    NEW.SCRATCH.FILE
  THEN
  ERROR.FLAG 0=
  UNTIL ;

: DELETE.WORLD.FILE
  RES.FILE.REF# @ VOLREF# !             \ set the volume reference number
  IODIR OFF                             \ set iodir to zero
  CURRENT.FILE.NAME DELETE$             \ delete the current file
  POST.FILE.ERROR? ;

: CHECK.RES.FILE
```

```
RES.FILE.ID @ 0 > if
  RES.FILE.ID @ USE.RES.FILE           \ guards against DA's setting other res first
THEN ;

: NOSAVE.ALERT
8 203 ResString                    \ " Unable to Save: "
DUP C@ PAD SWAP 1+ CMOVE
PAD
CURRENT.FILE.NAME
9 203 ResString                    \ "   an error has occured. "
""
401 IssueAlert  drop
;


: NEW.WORLD.FILE                   \ opens a new world file with the current globals
 0 LOCALS| N.FILE |
 0 to error.flag
 DEFAULT.RES.FILE DFLT.FILE.TYPE !         \ set the default type
 RES.FILE.REF# @ VOLREF# !
   IODIR OFF RW
   0 CURRENT.FILE.NAME NEW.FILE TO N.FILE       \ open a new file
   POST.FILE.ERROR?              \ post error if exists
   N.FILE 0 > IF
     N.FILE CLOSE
     POST.FILE.ERROR?            \ post error if there is one
     RES.FILE.REF# @ VOLREF# !         \ set io one shots
     IODIR OFF
     0 RES.FILE.REF# @ SETVOL       \ set volume
     CURRENT.FILE.NAME  CREATE.RES.FILE    \ create a resource fork to the file
     POST.RES.ERROR?             \ post eror if there is one
     RES.FILE.REF# @ VOLREF# !         \ set io one shots
     IODIR OFF
     0  RES.FILE.REF# @ SETVOL         \ set volume
     CURRENT.FILE.NAME
     OPEN.RES.FILE TO N.FILE         \ open the new file
     POST.RES.ERROR?             \ post error if there is one
   THEN
   Error.Flag 0 < if
     N.FILE CLOSE
     IODIR OFF
     0 RES.FILE.REF# @ SETVOL         \ set volume
     CURRENT.FILE.NAME DELETE$
     NOSAVE.ALERT
     0 CURRENT.FILE.NAME !          \ set untitled
     0 to N.FILE
   then
   N.FILE ;



: (GET.RES.FILE)                     \  -- file.id/true or false
 0 LOCALS|  FILE# |                  \ local for file#
  REPLY 74 ERASE 75 75 XY>POINT           \ point for screen position of dialog
 10 203 ResString                    \ " select the document  "
  'DEFAULT.FILE  1 REPLY (GET.FILE)          \ fetch the file via SFGetFile
  REPLY C@ BOOLEAN                   \ if not canceled
  IF
   REPLY 6+ <W@
   RES.FILE.REF# !                   \ and the global current file ref num
   REPLY 10+ DUP C@ 1+
   CURRENT.FILE.NAME SWAP CMOVE            \ current.file.name id name of this file
   ^?CLOSE.LAST.WINDOW EXECUTE             \ close the last window?
   IODIR OFF
```

```
  0 RES.FILE.REF# @ SETVOL                \ set volume should be an error
  CURRENT.FILE.NAME OPEN.RES.FILE
  TO FILE#                         \ open the res file
  FILE#  -1 =  IF
    POST.RES.ERROR? 0               \ handle error if there is one
    ELSE
    FILE#  -1                      \  else  false
  THEN
ELSE 0 THEN  ;


: (PUT.RES.FILE)                       \ --  file.id/true or false
  0 0 LOCALS| REF# FILE# |
    REPLY 74 ERASE                     \ clear reply
  DEFAULT.RES.FILE DFLT.FILE.TYPE !          \ set default file
  75 75 XY>POINT                     \ screen.position
  11 203 ResString                   \ " Save Under What Name?"
  OUTPUT.TITLE
  REPLY (PUT.FILE)                   \ buffer and call (put.file)
  DISCARD.ACTIVATES  FRONT.WINDOW (WINDOW)        \ put away nicely
  REPLY C@ BOOLEAN                              \ test for response
  IF                          \ if selected file
    REPLY 6+ <W@  TO REF#                \ set local ref#
    REF# RES.FILE.REF# !
    IODIR OFF
    REF# VOLREF# !                    \ set one shot
    REPLY 10+ DUP C@ 1-
    CURRENT.FILE.NAME SWAP CMOVE              \ save file name to global
      REPLY 10+ DELETES                \ delete this file
    NEW.WORLD.FILE
    TO FILE#
    FILE# -1 = IF
      FALSE
    ELSE
      FILE# TRUE
    THEN
    ELSE FALSE THEN  ;                \ 0 for cancel


:  PUT.RES.FILE                  \ saves the world to specified file
  0 LOCALS|  PUT.RES.ID   |
  0 TO ERROR.FLAG
  RESET.UNDO
  CLEAR.MOVING
  CLOSE.SCRATCH.FILE
  (PUT.RES.FILE) IF               \ fetch a recieving file
    TO PUT.RES.ID               \ put.res.id is file#
    PUT.RES.ID 0> IF
      SET.OUTPUT.TITLE
      Put.All.Records
      Do.Error.Alert
      PUT.RES.ID CLOSE.RES.FILE         \ close the new file
      Error.Flag 0 < if
        0 RES.FILE.REF# @ SetVol
        IODIR OFF
        CURRENT.FILE.NAME DELETES
        NOSAVE.ALERT
        0 CURRENT.FILE.NAME !
      then
    THEN
  THEN
  NEW.SCRATCH.FILE
  PUT.NEW.SCRATCH ;
```

```
: WRITE.WORLD                      \ writes world to current file
0  LOCALS| PUT.RES.ID  |               \ define locals
CURRENT.FILE.NAME C@  IF               \ if not a null string
  0 TO ERROR.FLAG
  RESET.UNDO
  CLEAR.MOVING
  CLOSE.SCRATCH.FILE
  DELETE.WORLD.FILE                \ delete the current file
  NEW.WORLD.FILE                   \ create a new world file
  TO PUT.RES.ID                    \ save file# as put.res.id
  PUT.RES.ID 0 > IF                  \ is it real?
    SET.OUTPUT.TITLE               \ set the window's title to this file name
    Put.All.Records
    Do.Error.Alert
    PUT.RES.ID CLOSE.RES.FILE            \ close the new file
    Error.Flag 0 < if
      0 RES.FILE.REF# @ SetVol
      IODIR OFF
      CURRENT.FILE.NAME DELETES
      NOSAVE.ALERT
      0 CURRENT.FILE.NAME !
    then
  THEN
  NEW.SCRATCH.FILE
  PUT.NEW.SCRATCH
THEN  ;


: SAVE.AS.WORLD                    \ save with dialog
  PUT.RES.FILE
CHECKIN.WORLD ;


: SAVE.WORLD                       \ saves without dialog if already in use
CURRENT.FILE.NAME C@ IF                \ checks for non nil name
  WRITE.WORLD                     \ if named, write out the file
  CHECKIN.WORLD                    \ check in the world
  ELSE
  PUT.RES.FILE                    \ if not named, use save as mode
  CHECKIN.WORLD
THEN ;

\ exit.world  open.world                       101686 yh


: GET.WORLD                       \ revert primative
0 LOCALS| GET.ID |
  DELETE.ALL.RECORDS                  \ delete the current records
CLOSE.SCRATCH.FILE                  \ close the scratch file
0 RES.FILE.REF# @ SETVOL               \ set the volume to the file name
CURRENT.FILE.NAME                   \ open the file
OPEN.RES.FILE TO GET.ID                \ store id in get.id
POST.RES.ERROR?
TRUE MATERIALS.EXIST !                 \ set the materials flag
GET.ID 0>  IF                     \ if no error...
  SET.OUTPUT.TITLE                 \ set the title
  0 to error.flag
  Get.All.Records                  \ load the records
  ERROR.FLAG IF
    DO.ERROR.ALERT                  \ post the error
```

```
    GET.ID CLOSE.RES.FILE           \ if error during load..
    Delete.All.Records              \ leave
  ELSE
    GET.ID CLOSE.RES.FILE           \ detach the records and close the file
    OPEN.SCRATCH.FILE               \ open new scratch file
    Put.All.Records
    TEMP.CLOSE.SCRATCH.FILE         \ temporary file close
    SET.OUTPUT.TITLE
  THEN
THEN
;

: CHECK.NEW.WORLD                   \ makes a new window
NEXT.OUTPUT.WINDOW IF               \ fetch next active window, if any
  CLEAR.SCRATCH.FILE
    NEW.WINDOW.TOKEN @ EXECUTE
  CHECKIN.WORLD
THEN   ;                   \ execute the token for a new window



:  GET.RES.FILE.WINDOW                     \ fetches resource file
 CURRENT.OUTPUT.WINDOW 0 LOCALS:  GET.ID C.OUT.WIN      \ delete the records
 0 TO ERROR.FLAG
 TRUE MATERIALS.EXIST !
 NEXT.OUTPUT.WINDOW IF                      \ if there is an available window...
 CLEAR.SCRATCH.FILE                       \ clear scratch file if there is one
 (GET.RES.FILE) IF                        \ this also closes last window
    TO GET.ID                         \ save the file number to get.id
    GET.ID 0> IF
      0 to error.flag
      Get.All.Records                   \ load the records
      ERROR.FLAG IF                     \ check for load errors
        GET.ID CLOSE.RES.FILE               \ close the file
        DELETE.ALL.RECORDS
        C.OUT.WIN TO CURRENT.OUTPUT.WINDOW
        DO.ERROR.ALERT
      ELSE
        GET.ID CLOSE.RES.FILE               \ close the file
        POST.RES.ERROR?                   \ post the error if needed
        IODIR OFF                     \ set one shot
        BEGIN
          NEW.SCRATCH.FILE
          PUT.ALL.RECORDS
          RES.FILE.ID @ 0> IF
            RES.FILE.ID @ CLOSE.RES.FILE       \ close the current file
            THEN
          ERROR.FLAG IF
            CLOSE.SCRATCH.FILE
          THEN
          ERROR.FLAG 0 =
        UNTIL
        DELETE.ALL.RECORDS                  \ delete the records
        NEW.WINDOW.TOKEN @ EXECUTE            \ open the new window
        ALREADY.OPEN? IF                \ check to see if it is already open
          ALREADY.OPEN.ALERT
          0 CURRENT.FILE.NAME C!            \ set to refer to no file
        THEN
        SET.OUTPUT.TITLE
        CHECKIN.WORLD
        THEN
    ELSE
```

```
    C.OUT.WIN TO CURRENT.OUTPUT.WINDOW
   THEN
 ELSE
 C.OUT.WIN TO CURRENT.OUTPUT.WINDOW           \ set to window used before cancel
 THEN
THEN   ;


: OPEN.WORLD                          \ opens a new file
    GET.RES.FILE.WINDOW   ;


  : (CLOSE.WORLD)                       \ close file primative
 WORLD.OUTPUT ?ACTIVE.WPTR IF
  RESET.UNDO                        \ fix 02/10/88  08:38:06 AM   YH
  DELETE.ALL.RECORDS                    \ delete the records
  CLOSE.SCRATCH.FILE                    \ close and delete the scratch file
  WORLD.OUTPUT CLOSE.WINDOW                 \ close the output window
  ^Close.edit.windows execute
  -1 TO LAST.OUTPUT.WINDOW
  0 IN.OBJECT.DRAWING !
  -1 BACK.FLAG !
  WINDOW.PICT @ 0 > IF
    WINDOW.PICT @ DISPOSE.PICTURE
    0 WINDOW.PICT !
  THEN
 THEN  ;                          \ set last window to none



 : CLOSE.WORLD                        \ closes with polite dialogs
 0 LOCALS| ALERT.RESPONSE
 WORLD.OBJECT SET.CURRENT.OBJECT              \ set world as current
 RES.STATE PLUCK UNUSED >                 \ if it is a real object
 OBJECT.APP PLUCK "SWVL = AND IF              \ and has real data...
    CHECKOUT.WORLD IF                 \ fixed, now sets dirty flag .
        SAVE.ALERT TO ALERT.RESPONSE           \ if changed then post alert
        ALERT.RESPONSE 1 = IF              \ first response is
      SAVE.WORLD                  \ save the world
            CURRENT.FILE.NAME OFF
      (CLOSE.WORLD)
    THEN
        ALERT.RESPONSE 2 = IF              \ second is just close
      CURRENT.FILE.NAME OFF
      (CLOSE.WORLD)
    THEN
      ELSE
      CURRENT.FILE.NAME OFF (CLOSE.WORLD)       \ if no changes, just quit
     THEN
 ELSE
   (CLOSE.WORLD)                       \ if bad tree, just close
 THEN MENU.OFF.TOKEN EXECUTE ;             \ turn off menus


: DRAW.WINDOW.PICT
 WINDOW.PICT @ 0> IF
   8 PENMODE
   WINDOW.PICT @ @ 2- @RECT
   TEMP.RECT !RECT
   V.TOOL.WIDTH  0
     TEMP.RECT
   MAKE.OFFSET.RECT
   WINDOW.PICT @ SWAP
   DRAW.PICTURE
```

```
  V.TOOL.WIDTH -1              \ display the bounds of the current backport
  ZBUFFERX @ V.TOOL.WIDTH + 1
    ZBUFFERY @
  FRAME RECTANGLE
THEN  ;


: EXIT.WORLD                          \ exit the whole mishgosh
CURRENT.OUTPUT.WINDOW                       \ declare locals
0 LOCALS| CANCEL.FLAG C.WINDOW
WORLD.OUTPUT ?ACTIVE.WPTR IF
   TEMP.CLOSE.SCRATCH.FILE                  \ just close the current scratch file
  -1 TO LAST.OUTPUT.WINDOW                  \ set no last window
THEN
0 TO CURRENT.OUTPUT.WINDOW                    \ start at the begining
BEGIN
  WORLD.OUTPUT ?ACTIVE.WPTR IF                \ if its an active little window...
    SCRATCH.TOKEN @ EXECUTE                 \ open the scratch
    WORLD.OUTPUT WINDOW                   \ set up for display...
    WORLD.OUTPUT BRING.TO.FRONT
    0 0 XYOFFSET
      SET.VIEW.LIMITS
    SCRATCH.TOKEN @ EXECUTE
    HILITE.V.TOOL
    BACK.FLAG @ IF
      DRAW.WINDOW.PICT
    ELSE
      DISPLAY.WORLD
    THEN
    CLOSE.WORLD                        \ otherwise close the world
    WORLD.OUTPUT ?ACTIVE.WPTR IF              \ if they want to cancel, set the flag
      -1 TO CANCEL.FLAG
      CURRENT.OUTPUT.WINDOW TO C.WINDOW       \ save the window to bring up later
    THEN
  THEN
  CURRENT.OUTPUT.WINDOW 1- TO CURRENT.OUTPUT.WINDOW   \ increment the count
  CURRENT.OUTPUT.WINDOW #WINDOWS              \ loop until end
  CANCEL.FLAG OR                     \ or until cancel
UNTIL
CANCEL.FLAG IF
  C.WINDOW TO CURRENT.OUTPUT.WINDOW           \ REDRAW THE BUFFERS
  WORLD.OBJECT TREE.CHANGED + CHANGED.FLAG !
ELSE
  RELEASE.PRINT.RECORD
  RELEASE.D.TITLE                    \ release the handle for print dialog
  SCRAPSAFE?
  DISPOSE.HEAP
  BYE                          \ and leave
THEN ;

FIND EXIT.WORLD EXIT.TOKEN !                \ set as executable token for errors
```

APPENDIX 1(CONTINUED)

```
\ find panel

cr ." Loading Find Panel..."

607 MakeSwapOver DO.FIND.PANEL
StartSwapOver


8200  NEW.DIALOG.RECORD

 1 MAKE.ACTIVE.ITEM FIND.OK
 2 MAKE.ACTIVE.ITEM FIND.BUTTON
 3 MAKE.ACTIVE.ITEM UP.BUTTON
 4 MAKE.ACTIVE.ITEM DOWN.BUTTON
 5 MAKE.ACTIVE.ITEM LEFT.BUTTON
 6 MAKE.ACTIVE.ITEM RIGHT.BUTTON
 7 MAKE.TEXT.ITEM FIND.NAME
 8 MAKE.TEXT.ITEM FIND.STRING

NAME.DIALOG.RECORD FIND.PANEL

0 FIND.STRING !

: GET.FIND.PANEL
  OBJECT.STRING
  FIND.NAME CLEAR.STRING
    DUP OBJECT.STRING SWAP DROP EXT C!
    1+ SWAP MOVE.RECORD ;

: PUT.FIND.PANEL
   FIND.NAME 1+  OBJECT.STRING  MOVE.RECORD
   OBJECT.CHANGED
   CURRENT.OBJECT @ CHANGED.FLAG ! ;


: FIND.NAMED.OBJECT
  ' FIND.STRING GET.ITEM.TEXT
    PAD 24 BLANKS
    FIND.STRING 1+ PAD 1+ FIND.STRING C@ CMOVE
    20 PAD C!
    FIND.OBJECT ;

  : GET.FOUND.OBJECT                  \  OBJECT.ID --- SETS PANEL TO THAT OBJECT IF REAL
    CURRENT.OBJECT @
    LOCALS|  C.OBJECT FOUND.OBJECT
         FOUND.OBJECT  WORLD.OBJECT >
         FOUND.OBJECT  LAST.OBJECT < AND IF
      FOUND.OBJECT SET.CURRENT.OBJECT
      OBJECT.STATE PLUCK UNUSED > IF
        C.OBJECT SET.CURRENT.OBJECT
             MARK.CHANGE
        OBJECT.CHANGED
          FIND.PANEL GET.ITEM.DATA
             PUT.FIND.PANEL
            FOUND.OBJECT
            SET.CURRENT.OBJECT
              GET.FIND.PANEL
        FIND.PANEL SET.ITEMS
          ELSE
        C.OBJECT SET.CURRENT.OBJECT
      THEN
     THEN   ;
```

```
: GET.NAMED.OBJECT
  LOCALS| C.ITEM HIT.ITEM C.RECORD |
      FIND.NAMED.OBJECT
  GET.FOUND.OBJECT ;

FIND GET.NAMED.OBJECT FIND.BUTTON !


: GET.RIGHT.OBJECT
  LOCALS| C.ITEM HIT.ITEM C.RECORD |
      RIGHT.TREE PLUCK
  GET.FOUND.OBJECT ;

FIND GET.RIGHT.OBJECT RIGHT.BUTTON !


: GET.LEFT.OBJECT
  LOCALS| C.ITEM HIT.ITEM C.RECORD
      LEFT.TREE PLUCK
  GET.FOUND.OBJECT ;

FIND GET.LEFT.OBJECT LEFT.BUTTON !


: GET.UP.OBJECT
  LOCALS| C.ITEM HIT.ITEM C.RECORD ,
      UP.TREE PLUCK
  GET.FOUND.OBJECT ;

FIND GET.UP.OBJECT UP.BUTTON !


: GET.DOWN.OBJECT
  LOCALS| C.ITEM HIT.ITEM C.RECORD
      DOWN.TREE PLUCK
  GET.FOUND.OBJECT ;

FIND GET.DOWN.OBJECT DOWN.BUTTON !


: (DO.FIND.PANEL)
  GET.FIND.PANEL
  FIND.PANEL HANDLE.DIALOG
  PUT.FIND.PANEL ;


SetSwapOverToken
EndSwapOver
```

```
\ FIXED MEASURE STUFF

\ ANEW -FIXED.MEASURE-

CR
." Loading Fixed Measure Coversions..."


72 DECIMAL.SCALE  *   CONSTANT INCH.CONVERT
INCH.CONVERT  100 * 254 / CONSTANT CENTI.CONVERT
1 DECIMAL.SCALE * CONSTANT SCREEN.CONVERT
ASCII - CONSTANT SIGN.CHAR
1 fix.scale scale constant full.scale


  : FIX>MEASURE

    decimal.scale
    full.scale  */ROUND
    decimal.scale
    FIX.SCREEN.TO.MEASURE @
    */ROUND ;

  : MEASURE>FIX
    full.scale
    decimal.scale */ROUND
    FIX.SCREEN.TO.MEASURE @
    decimal.scale
    */ROUND ;

  : FIX.GRID
    FIX.MEASURE.DIV  @ LOCALS  THE.UNIT THE.N
    THE.N 0 < IF
    THE.N
    FIX>MEASURE
      THE.UNIT *
      decimal.scale 2/ -
      decimal.scale /
      decimal.scale
      THE.UNIT  */ROUND
    MEASURE>FIX
    ELSE
    THE.N
    FIX>MEASURE
      THE.UNIT *
      decimal.scale 2/ +
      decimal.scale /
      decimal.scale
      THE.UNIT  */ROUND
    MEASURE>FIX
    THEN ;


 : Do.MEASURE.SCALE
  LOCALS| N.^  N.1 |
  N.^ IF
  N.^ ABS 0 DO
    N.1
    N.^ 0 > IF
      FIX.MEASURE.BASE @ *
    ELSE
      FIX.MEASURE.BASE @ /
    THEN
    TO N.1
```

```
LOOP
THEN
N.1 ;


: STRIP.BLANKS
 0 LOCALS| $COUNT THE$ |
 THE$ C@ IF
   BEGIN
     $COUNT THE$ C@ =
     THE$ 1+ $COUNT + C@ 32 = NOT
     OR
     $COUNT 1+ TO $COUNT
   UNTIL
   THE$ $COUNT -
   THE$ C@ 1+ $COUNT -
   TO $COUNT TO THE$
   $COUNT IF
     BEGIN
       THE$ $COUNT + 1- C@ 32 =
       WHILE
       $COUNT 1- TO $COUNT
     REPEAT
   THEN
 THEN
 THE$ $COUNT ;


 : MEASURE$>MEASURE                  \ string -- fixed
   0 0 LOCALS| N.^ N.1 |
 STRIP.BLANKS $>NUMBER
 0= IF 0 THEN
 TO N.1
 FIX.MEASURE.PLACES @ DPL @  - TO N.^
 N.1 N.^ Do.MEASURE.SCALE
 ;

 : MEASURE$>ANGLE
 MEASURE$>MEASURE
 ANGLE.SCALE *
 DECIMAL.SCALE 2/ +
 DECIMAL.SCALE / ;


: MEASURE$>FIXED                     \ string -- fixed
   0 0 LOCALS| N.^ N.1 |
 STRIP.BLANKS $>NUMBER
 0= IF 0 THEN  TO N.1
 FIX.MEASURE.PLACES @ DPL @  - TO N.^
 N.1 N.^ Do.MEASURE.SCALE
 MEASURE>FIX
 ;

: MEASURE>MEASURE$!
  0 0  LOCALS|  THE.SIGN D@ TPAD                \ n string -- stores string
   DUP 0 < IF
     -1 TO THE.SIGN                    \ n -- test sign
   THEN
   ABS                              \ use absolute value
     NUMBER>$ DUP TPAD C! TPAD 1- SWAP CMOVE>      \ covert to string and move to address
     TPAD C@ FIX.MEASURE.PLACES @ - TO D@
   D@ 0 < IF                          \ if below decimal point
     D@ ABS TO D@                     \ d2 is negative, set positive
```

```
  TPAD 1+ TPAD 2+ D@ - TPAD C@ CMOVE>        \ shift the string d@ over
  FIX.MEASURE.CHAR @ TPAD 1- C!           \ place decimal point
  D@ 0 DO
    ASCII 0 TPAD 2+ I+ C!              \ fill remaining spaces with zeros
  LOOP
  TPAD C@ D@ + 1+ TPAD C!              \ correct the string count
ELSE
  TPAD 1+ D@ +                    \ if number is above decimal point...
  DUP 1+                        \ shift number 1 place for decimal
  FIX.MEASURE.PLACES @ CMOVE>
  FIX.MEASURE.CHAR @                \ store the decimal char
  TPAD 1+ D@ + C!
  TPAD C@ 1+ TPAD C!                \ update the count
THEN
TPAD 1+ C@ FIX.MEASURE.CHAR @ = IF
  TPAD 1+ TPAD 2+  TPAD C@  CMOVE>        \ if decimal point is first...
  ASCII 0 TPAD 1+  C!              \ insert a zero
  TPAD C@ 1+ TPAD C!                \ update the count
then
THE.SIGN IF                    \ check the sign
  TPAD 1+ TPAD 2+  TPAD C@  CMOVE>        \ if negative, shift down one
  SIGN.CHAR TPAD 1+  C!              \ place the sign char
  TPAD C@ 1+ TPAD C!                \ update the count
THEN ;


: ANGLE>MEASURES!
  SWAP
    DECIMAL.SCALE
      ANGLE.SCALE */ROUND
  SWAP
    MEASURE>MEASURES! ;


: FIXED>MEASURES!                  \ n string -- stores string
  SWAP
    FIX>MEASURE
  SWAP
    MEASURE>MEASURES! ;
```

```
ANEW GRIDS

CR ." Loading grid stuff... "

\ Words to add grids and limits to the swiv
\ Last Revision: 06/02/87  09:57:07 AM  YH

 0 CONSTANT ^GET.CONSTRAIN.ATTITUDE

 CREATE  LIMIT?  0  ,

 CREATE THIS.3ANGLE  12 ALLOT
 CREATE LAST.3ANGLE  12 ALLOT


 CODE A.RANGER            \ n , max , min  -- clipped angle n
  D0 POP,             \ min
  D1 POP,             \ max
  D2 POP,             \ n
  LIMIT? A0 )#MOVE,
  D2 FULL.ANGLE 2/  LONG CMPI, GT IF,     \ if n > 180 then set in minus range
     D2 FULL.ANGLE NEG  LONG ADDI, THEN,
  D0 D2 LONG CMP, MI IF,       \ compare to min
    D0 D2 LONG MOVE,       \ clip if needed
    -1 # A0 () LONG MOVE,      \ set flag
    THEN,
  D2 D1 LONG CMP, MI IF,       \ compare to max
    D1 D2 LONG MOVE,       \ clip if needed
    -1 # A0 () LONG MOVE,      \ set flag
    THEN,
  D2 PUSH, NEXT END-CODE


 CODE RANGER             \ n , max , min  -- clipped n
  D0 POP,             \ min
  D1 POP,             \ max
  D2 POP,             \ n
  LIMIT? A0 )#MOVE,
  D0 D2 LONG CMP, MI IF,       \ compare to min
    D0 D2 LONG MOVE,       \ clip if needed
    -1 # A0 () LONG MOVE,      \ set flag
  THEN,
  D2 D1 LONG CMP, MI IF,       \ compare to max
    D1 D2 LONG MOVE,       \ clip if needed
    -1 # A0 () LONG MOVE,      \ set flag
  THEN,
  D2 PUSH, NEXT END-CODE      \ push result


 : 3POS.LIMIT               \ x y z -- x y z imposes position limits and grid
    LOCALS| Z Y X |               \ set up locals
   Z Z.RANGE PLUCK RANGER TO Z          \ range for z
   Y Y.RANGE PLUCK RANGER TO Y          \ range for y
   X X.RANGE PLUCK RANGER TO X          \ range for x
   X Y Z ;                   \ push vector on stack


 : 3POS.GRID                \ x y z -- x y z imposes position limits and grid
```

```
LOCALS| Z Y X |
USE.3GRID? @ IF
   Z FIX.GRID TO Z            \ grid for  z
  Y FIX.GRID TO Y            \ grid for  y
  X FIX.GRID TO X            \ grid for  x
THEN
X Y Z  ;                  \ push vector on stack

: SET.THIS.3.ANGLE
0 0 0                   \ cosines  -- cosines  attitude grid and limits
LOCALS|  A.YAW A.PITCH A.ROLL |      \ set up locals
  ANGLE  TO A.YAW          \ angle for yaw
  ANGLE  TO A.PITCH        \ angle for pitch
  ANGLE  TO A.ROLL         \ angle for roll
  A.ROLL A.PITCH A.YAW
  THIS.3ANGLE 12 LPLACE      ;   \ save as current angles


: 3ATT.GRID
 0 0 0   ATT.GRID PLUCK                 \ cosines  -- cosines  attitude grid and limits
 LOCALS| A.GRID A.YAW A.PITCH A.ROLL             \ set up locals
  USE.3GRID? @ IF
  ANGLE A.GRID 2/ + A.GRID / A.GRID * TO A.YAW     \ grid for yaw
  ANGLE A.GRID 2/ + A.GRID / A.GRID * TO A.PITCH    \ grid for pitch
  ANGLE A.GRID 2/ + A.GRID / A.GRID * TO A.ROLL    \ grid for roll
  A.ROLL  COS A.ROLL  SIN               \ convert angles to cosines
  A.PITCH COS A.PITCH SIN
  A.YAW   COS A.YAW   SIN
 THEN ;


: 3ATT.LIMIT
 0 0 0                  \ cosines  -- cosines  attitude grid and limits
 LOCALS|  A.YAW A.PITCH A.ROLL          \ set up locals
  ANGLE
  YAW.RANGE PLUCK A.RANGER TO A.YAW      \ range for yaw
  ANGLE
  PITCH.RANGE PLUCK A.RANGER TO A.PITCH \ range for pitch
  ANGLE
  ROL.RANGE PLUCK A.RANGER TO A.ROLL     \ range for roll
  A.ROLL  COS A.ROLL  SIN          \ convert angles to cosines
  A.PITCH COS A.PITCH SIN
  A.YAW   COS A.YAW   SIN  ;



: CONSTRAIN.YAW.ATTITUDE
LINK.TYPE PLUCK
YAW.LOCK AND IF
  CURSOR.RCOS  4+ @        \ cos
  CURSOR.RCOS  @          \ sin
  2DUP
  NEG
  YAW.SIN !
  YAW.COS !
  TYAW.SIN !
  TYAW.COS !
ELSE
  TEST.VEC 24 + @
  TEST.VEC 32 + @
   NORMAL2
   CHECK.NIL
  neg
```

```
  ANGLE
  YAW.RANGE PLUCK A.RANGER
  DUP NEG YAW
  DUP SIN  TYAW.SIN !
  COS TYAW.COS !
THEN
  0 PITCH
  0 ROL
  TEST.SWIVEL  ;

: CONSTRAIN.PITCH.ATTITUDE
 LINK.TYPE PLUCK
 PITCH.LOCK AND IF
   CURSOR.RCOS  12 + @        \ cos
   CURSOR.RCOS  8 +  @        \ sin
   2DUP
   NEG
   PITCH.SIN !
   PITCH.COS !
   TPITCH.SIN !
   TPITCH.COS !
 ELSE
     TEST.VEC 24 + @
   TEST.VEC 28 + @
     NORMAL2
     CHECK.NIL
   NEG
   ANGLE
   PITCH.RANGE PLUCK A.RANGER
   DUP NEG PITCH
   DUP SIN  TPITCH.SIN !
   COS TPITCH.COS !
 THEN
   0 YAW
   0 ROL
   TEST.SWIVEL  ;

: CONSTRAIN.ROLL.ATTITUDE
 LINK.TYPE PLUCK
 ROL.LOCK AND IF
   CURSOR.RCOS 20 + @         \ cos
   CURSOR.RCOS 16 +  @          \ sin
   TROLL.SIN !
   TROLL.COS !
 ELSE
     TEST.VEC 8 + @
   TEST.VEC 4 + @
     NORMAL2
     CHECK.NIL
   ANGLE
   ROL.RANGE PLUCK A.RANGER
   DUP SIN TROLL.SIN !
   COS TROLL.COS !
 THEN  ;


: (GET.CONSTRAIN.ATTITUDE)
 CONSTRAIN.YAW.ATTITUDE
 CONSTRAIN.PITCH.ATTITUDE
 CONSTRAIN.ROLL.ATTITUDE ;


 FIND (GET.CONSTRAIN.ATTITUDE) ' ^GET.CONSTRAIN.ATTITUDE !
```

```
: GET.CONSTRAIN.ATTITUDE ^GET.CONSTRAIN.ATTITUDE EXECUTE ;


: GRID.RELATIVE               \ imposes grid and limits on relative object space
  OBJECT.R3POS PLUCK            \ limit and grid relative position
  3POS.GRID
  3POS.LIMIT
  OBJECT.R3POS PLACE
  OBJECT.RCOS  PLUCK            \ limit and grid relative attitude
  3ATT.GRID
  \ 3ATT.LIMIT
  OBJECT.RCOS  PLACE
  OBJECT.ACOS  PLUCK
  SET.THIS.3.ANGLE ;
```

```
\ halftone settings for postscript

ANEW -HALF.PANEL-

 9011 NEW.DIALOG.RECORD

  1 MAKE.ACTIVE.ITEM  HALF.OK
  2 MAKE.ACTIVE.ITEM  HALF.CANCEL
  3 MAKE.RADIO.ITEM   HALF.ZERO
  4 MAKE.RADIO.ITEM   HALF.THIRTY
  5 MAKE.RADIO.ITEM   HALF.SIXTY
  6 MAKE.RADIO.ITEM   HALF.50.RES
  7 MAKE.RADIO.ITEM   HALF.74.RES
  8 MAKE.RADIO.ITEM   HALF.100.RES
  9 MAKE.RADIO.ITEM   HALF.150.RES
  10 MAKE.RADIO.ITEM  HALF.BLACK
  11 MAKE.RADIO.ITEM  HALF.CYAN
  12 MAKE.RADIO.ITEM  HALF.MAGENTA
  13 MAKE.RADIO.ITEM  HALF.YELLOW

 NAME.DIALOG.RECORD Halftone.panel

  1 ITEM.BANK.OF HALF.50.RES !
  1 ITEM.BANK.OF HALF.74.RES !
  1 ITEM.BANK.OF HALF.100.RES !
  1 ITEM.BANK.OF HALF.150.RES !

  2 ITEM.BANK.OF HALF.BLACK !
  2 ITEM.BANK.OF HALF.CYAN !
  2 ITEM.BANK.OF HALF.MAGENTA !
  2 ITEM.BANK.OF HALF.YELLOW !

  1 HALF.ZERO !
  1 HALF.50.RES !
  1 HALF.BLACK !

 602 MakeSwapOver DO.HALF.PANEL

 StartSwapOver

   : SET.HALF.STRING
     0
     HALF.THIRTY   @ IF 4 + THEN
     HALF.SIXTY    @ IF 8 + THEN
     HALF.74.RES   @ IF 1 + THEN
     HALF.100.RES  @ IF 2 + THEN
     HALF.150.RES  @ IF 3 + THEN
     HALFTONE.SCREEN !
     0
     HALF.CYAN    @ IF 1 + THEN
     HALF.MAGENTA  @ IF 2 + THEN
     HALF.YELLOW   @ IF 3 + THEN
     HALFTONE.COLOR !
     ;

   : HALF.BYE
    LOCALS| C.ITEM HIT.ITEM C.RECORD
      DROP 1   ;

       FIND HALF.BYE HALF.CANCEL !

  : HALF.SAVE
    LOCALS| C.ITEM HIT.ITEM C.RECORD
```

```
   SET.HALF.STRING ;

  FIND HALF.SAVE HALF.OK :

: (DO.HALF.PANEL)
     Halftone.panel HANDLE.DIALOG ;

SetSwapOverToken
EndSwapOver
```

```
\ CENTER NODES

CR ." Loading Drawing Center Handling..."

  CODE FIX>GRAPHIC
    SAVE.REGS
    D0 POP, D1 POP, D2 POP,
    FIX.SCALE GRAPHIC.SHIFT NORMAL.SHIFT - -
    D3 MOVEQ,
    D0 D3 LONG ASR,
    D1 D3 LONG ASR,
    D2 D3 LONG ASR,
    D2 PUSH,
    D1 PUSH,
    D0 PUSH,
    RESTORE.REGS
    NEXT END-CODE

  CODE GRAPHIC>FIX
    SAVE.REGS
    D0 POP, D1 POP, D2 POP,
    FIX.SCALE GRAPHIC.SHIFT NORMAL.SHIFT - -
    D3 MOVEQ,
    D0 D3 LONG ASL,
    D1 D3 LONG ASL,
    D2 D3 LONG ASL,
    D2 PUSH,
    D1 PUSH,
    D0 PUSH,
    RESTORE.REGS
    NEXT END-CODE


  : DRAW.NODE    \  X Y --
    LOCALS| THE.Y THE.X |
    1 1 PENSIZE
    10 PENMODE
    THE.X THE.Y 30 - Q.MOVE.TO
    THE.X THE.Y 30 + Q.LINE.TO
    THE.X 30 -  THE.Y Q.MOVE.TO
    THE.X 30 +  THE.Y Q.LINE.TO ;


  : DRAW.TOP.NODE
    0 0 0 LOCALS| T.X T.Y T.Z |
    CURRENT.QUAD @ >R
    SAVE.CLIP >R
    TOP.QUAD CLIP.RECT
    TOP.QUAD CURRENT.QUAD !
    O.CENTER 12 LPLUCK
      FIX>GRAPHIC
    NEG TO T.Z TO T.Y TO T.X
    T.Z T.X DRAW.NODE
    R> RESTORE.CLIP
    R> CURRENT.QUAD ! ;

  : DRAW.SIDE.NODE
    0 0 0 LOCALS| T.X T.Y T.Z
    CURRENT.QUAD @ >R
    SAVE.CLIP >R
    SIDE.QUAD CLIP.RECT
```

```
    SIDE.QUAD CURRENT.QUAD !
    O.CENTER 12 LPLUCK
    FIX>GRAPHIC
    NEG TO T.Z TO T.Y TO T.X
    T.Z T.Y  DRAW.NODE
    R> RESTORE.CLIP
    R> CURRENT.QUAD ! ;

: DO.TOP.NODE?
    0 0 0 LOCALS| T.X T.Y T.Z |
    O.CENTER 12 LPLUCK
    FIX>GRAPHIC
    NEG TO T.Z
    TO T.Y TO T.X
    T.Z T.X
      CURRENT.QUAD @
      >TRANSLATE
      @MOUSE.DN POINT>XY NEAR IF
      DRAW.SIDE.NODE
      DRAW.TOP.NODE
      BEGIN
        @GRIDXY
        2DUP DRAW.RULE.MARKS
        2DUP
        DRAW.NODE
        MOVE/UNCLICK
        DRAW.NODE
      MOUSE.BUTTON NOT UNTIL
      @GRIDXY 0
      GRAPHIC>FIX
      DROP
      TO T.X NEG TO T.Z
      O.CENTER 4+ @ TO T.Y
      T.X T.Y T.Z  O.CENTER 12 LPLACE
      DRAW.SIDE.NODE
      DRAW.TOP.NODE
    THEN ;

  : DO.SIDE.NODE?
    0 0 0 LOCALS| T.X T.Y T.Z |
    O.CENTER 12 LPLUCK
    FIX>GRAPHIC
    NEG TO T.Z TO T.Y TO T.X
    T.Z T.Y
    CURRENT.QUAD @
    >TRANSLATE
    @MOUSE.DN POINT>XY NEAR IF
      DRAW.TOP.NODE
      DRAW.SIDE.NODE
      BEGIN
        @GRIDXY
        2DUP DRAW.RULE.MARKS
        2DUP
        DRAW.NODE
        MOVE/UNCLICK
        DRAW.NODE
      MOUSE.BUTTON NOT UNTIL
      @GRIDXY 0
      GRAPHIC>FIX DROP
      TO T.Y NEG TO T.Z
      O.CENTER 8+ @ TO T.X
      T.X T.Y T.Z  O.CENTER 12 LPLACE
```

```
  DRAW.TOP.NODE
  DRAW.SIDE.NODE
THEN ;
```

```
\ TWEENING INHERITS

ANEW INHERIT.DIALOG

CREATE  INHERIT.BITS  0 ,

603 MakeSwapOver DO.INHERIT.PANEL

StartSwapOver

cr ." Loading Inherit Panel "

    5004 NEW.DIALOG.RECORD

  1 MAKE.ACTIVE.ITEM  INHERIT.OK
  2 MAKE.ACTIVE.ITEM  INHERIT.CANCEL
  3 MAKE.CHECK.ITEM   INHERIT.PPOSITION
  4 MAKE.CHECK.ITEM   INHERIT.PATTITUDE
  5 MAKE.CHECK.ITEM   INHERIT.PSCALE
  6 MAKE.CHECK.ITEM   INHERIT.PCOLOR
  7 MAKE.CHECK.ITEM   INHERIT.PFORM
  8 MAKE.CHECK.ITEM   INHERIT.PRENDER

  NAME.DIALOG.RECORD INHERIT.PANEL

  2 base !
  1      CONSTANT INHERIT.POSITION.BIT
  10     CONSTANT INHERIT.ATTITUDE.BIT
  100    CONSTANT INHERIT.SCALE.BIT
  1000   CONSTANT INHERIT.COLOR.BIT
  10000    CONSTANT INHERIT.FORM.BIT
  100000   CONSTANT INHERIT.RENDER.BIT
  111111    CONSTANT INHERIT.ALL
  DECIMAL

  : RESET.INHERIT
    INHERIT.ALL INHERIT.BITS ! ;

  : SET.INHERIT.PANEL
    INHERIT.BITS @ INHERIT.SCALE.BIT AND IF
       1 INHERIT.PSCALE !
    ELSE
       0 INHERIT.PSCALE !
    THEN
    INHERIT.BITS @ INHERIT.ATTITUDE.BIT AND IF
       1 INHERIT.PATTITUDE !
    ELSE
      0 INHERIT.PATTITUDE !
    THEN
    INHERIT.BITS @ INHERIT.COLOR.BIT AND IF
       1 INHERIT.PCOLOR !
    ELSE
      0 INHERIT.PCOLOR !
    THEN
    INHERIT.BITS @ INHERIT.POSITION.BIT AND IF
       1 INHERIT.PPOSITION !
    ELSE
       0 INHERIT.PPOSITION !
    THEN
    INHERIT.BITS @ INHERIT.FORM.BIT AND IF
```

```
   1 INHERIT.PFORM !
ELSE
   0 INHERIT.PFORM !
THEN
INHERIT.BITS @ INHERIT.RENDER.BIT AND IF
   1 INHERIT.PRENDER !
ELSE
   0 INHERIT.PRENDER !
THEN ;


: GET.INHERIT.PANEL
 0 INHERIT.BITS !
 INHERIT.PSCALE @ IF
   INHERIT.BITS @
   INHERIT.SCALE.BIT +
   INHERIT.BITS !
 THEN
 INHERIT.PATTITUDE @ IF
   INHERIT.BITS @
   INHERIT.ATTITUDE.BIT +
   INHERIT.BITS !
 THEN
 INHERIT.PCOLOR @ IF
   INHERIT.BITS @
   INHERIT.COLOR.BIT +
   INHERIT.BITS !
 THEN
 INHERIT.PPOSITION @ IF
   INHERIT.BITS @
   INHERIT.POSITION.BIT +
   INHERIT.BITS !
 THEN
 INHERIT.PFORM @ IF
   INHERIT.BITS @
   INHERIT.FORM.BIT +
   INHERIT.BITS !
 THEN
 INHERIT.PRENDER @ IF
   INHERIT.BITS @
   INHERIT.RENDER.BIT +
   INHERIT.BITS !
 THEN  ;


  : INHERIT.ATTITUDE
 CURRENT.OBJECT @ WORLD.OBJECT = NOT IF
     ^OBJECT.RCOS MAKE.TREE.ATTRIBUTE
 THEN ;

 : INHERIT.POSITION
  CURRENT.OBJECT @ WORLD.OBJECT = NOT IF
     ^OBJECT.R3POS MAKE.TREE.ATTRIBUTE
     THEN ;

  : INHERIT.TYPE
  CURRENT.OBJECT @ WORLD.OBJECT = NOT IF
       SET.TREE.CONTOURS
 THEN ;

  : INHERIT.SCALE
  CURRENT.OBJECT @ WORLD.OBJECT = NOT IF
     ^OBJECT.RSCALE MAKE.TREE.ATTRIBUTE
 THEN ;
```

```
: INHERIT.RENDER
  CURRENT.OBJECT @ WORLD.OBJECT - NOT IF
     TOKEN.FOR OBJECT.RENDER MAKE.TREE.ATTRIBUTE
 THEN ;

: INHERIT.TREE.RGB
  WORLD.OBJECT CURRENT.OBJECT = NOT IF
    OBJECT.FORM PLUCK PICT.FORM < IF
        ^OBJECT.RGBCOLOR
        MAKE.TREE.ATTRIBUTE
        ^OBJECT.PALETTE.INDEX
        MAKE.TREE.ATTRIBUTE
        TOKEN.FOR OBJECT.REFLECT
      MAKE.TREE.ATTRIBUTE
      TOKEN.FOR OBJECT.MATERIAL.INDEX
      MAKE.TREE.ATTRIBUTE
      TOKEN.FOR OBJECT.DIRECT.SCALE
      MAKE.TREE.ATTRIBUTE
      TOKEN.FOR OBJECT.SPECULAR.SCALE
      MAKE.TREE.ATTRIBUTE
    THEN
    THEN ;

: I.BYE
  LOCALS| C.ITEM HIT.ITEM C.RECORD |
    DROP 1    ;

     FIND I.BYE INHERIT.CANCEL !

: I.OK
  LOCALS| C.ITEM HIT.ITEM C.RECORD |
  INHERIT.PANEL GET.ITEM.DATA
    INHERIT.PATTITUDE @ IF
      INHERIT.ATTITUDE  THEN
      INHERIT.PPOSITION @ IF
      INHERIT.POSITION  THEN
    INHERIT.PFORM @ IF
      INHERIT.TYPE    THEN
      INHERIT.PSCALE @ IF
       INHERIT.SCALE    THEN
  INHERIT.PCOLOR @ IF
        INHERIT.TREE.RGB  THEN
  INHERIT.PRENDER @ IF
        INHERIT.RENDER    THEN
  GET.OBJECT
      REDRAW.OBJECT
      DISPLAY.WORLD.OUTPUT ;

  FIND I.OK INHERIT.OK !

  : (DO.INHERIT.PANEL)
    CURRENT.OBJECT @ WORLD.OBJECT >
    CURRENT.OBJECT @ LAST.OBJECT < AND
    CURRENT.HANDLE 0= NOT  AND IF
      SET.INHERIT.PANEL
      INHERIT.PANEL HANDLE.DIALOG
      GET.INHERIT.PANEL
    THEN  ;
```

```
SetSwapOverToken
EndSwapOver
```

```
( INTERFACE FOR Swivel )

CR ." Loading interface..."

ANEW INTERFACE

\ cursors

  HEX  create LINK.cursor
       0080:0080 , 0080:0080 , 0080:0080 ,  0080:FFFF ,
       0080:0080 , 0080:0080 , 0080:0080 ,  0080:0080 ,
       0000:0000 , 0000:0000 ,  0000:0000 , 0000:0000 ,
       0000:0000 , 0000:0000 ,  0000:0000 , 0000:0000 ,
       0008:0008 ,    DECIMAL


  CREATE WHAT.TO.DO 0 ,
   VARIABLE MOVER              \ highest level moving object
   VARIABLE MOVER.LEVEL



  HEX
  : UEXT FFFF AND ;
  DECIMAL

   0 CONSTANT ^(FLASH.SELECTED)

  : SET.LINK.CURSOR  LINK.CURSOR SET.CURSOR ;
  : SET.MOVE.CURSOR  INIT.CURSOR  ;


  : SET.V.CURSORS
    CURRENT.V.TOOL @ CASE
    XY.ARROW OF SET.MOVE.CURSOR ENDOF
    ZY.ARROW OF SET.MOVE.CURSOR ENDOF
    YAW.ARROW OF SET.MOVE.CURSOR ENDOF
    PITCH.ARROW OF SET.MOVE.CURSOR ENDOF
    ROL.ARROW OF SET.MOVE.CURSOR ENDOF
    SCALE.TOOL OF SET.MOVE.CURSOR ENDOF
    BLOCK.TOOL  OF SET.MOVE.CURSOR ENDOF
    EXTRUSION.TOOL  OF SET.MOVE.CURSOR ENDOF
    LINK.TOOL OF SET.LINK.CURSOR ENDOF
    LOCK.TOOL OF SET.LINK.CURSOR ENDOF
    BLINK.TOOL OF SET.LINK.CURSOR ENDOF
    UNLINK.TOOL OF SET.LINK.CURSOR ENDOF
    ZOOM.IN.TOOL  OF SET.MOVE.CURSOR ENDOF
    ZOOM.OUT.TOOL  OF SET.MOVE.CURSOR ENDOF
    OBJECT.PALETTE  OF SET.MOVE.CURSOR ENDOF
  ENDCASE ;


\ Reset Mouse
HEX
8CE CONSTANT CRSR.NEW
8CF CONSTANT CRSR.COUPLE
828 CONSTANT MTEMP
82C CONSTANT RAWMOUSE
DECIMAL


 HEX 2F0 CONSTANT  DOUBLE.TIME  DECIMAL
```

```
 CREATE @LAST.DN 0 ,
 CREATE WHEN.DN 0 ,

: MOUSE.WHEN..
  MOUSE.DOWN.RECORD
  8+ @ ;

: DOUBLE.CLICK
  DUP MOUSE.DOWN = IF
    @MOUSE.DN POINT>XY
    @LAST.DN @ POINT>XY
    ROT - ABS >R
    - ABS R> + 8 <
    MOUSE.WHEN..
    WHEN.DN @  -
    DOUBLE.TIME @ < AND IF
    DROP 0 -1 ELSE 0 THEN
    @MOUSE.DN @LAST.DN !
    MOUSE.WHEN.. WHEN.DN !
  ELSE 0 THEN  ;


 : RESET.MOUSE
  XY>POINT
  LOCAL>GLOBAL
  LOCALS| THE.POINT |
     0 CRSR.COUPLE C!
    THE.POINT MTEMP !
        THE.POINT RAWMOUSE !
      -1 CRSR.COUPLE C!
    -1 CRSR.NEW C! ;

 : RESET.CENTER
  OBJECT.A3POS PLUCK
  3>2POS RESET.MOUSE ;


\ display routines, selection

  4 CONSTANT MOVE.THRESH

   : MOVING?
     @MOUSEXY @MOUSE.DN POINT>XY
   ROT SWAP - >R - R> + MOVE.THRESH >  ;

     CREATE LAST.SELECTED 1 ,
     VARIABLE CHNG.FLG  1 CHNG.FLG !



   : SELECT.CURRENT          \ hilites current object
     CURRENT.OBJECT @ WORLD.OBJECT > IF
     OBJECT.STATE PLUCK UNUSED > IF
   CURRENT.OBJECT @ WORLD.OBJECT -
   OBJECT.ID !
     OBJECT.RECT PLUCK
   POLY.CLIP
     HILITE.RECT 2DROP 2DROP
     THEN THEN  ;

                                      ( 120186 YH )
```

```
: SHOW.SELECTED          \ displays world with selected object
   SELECT.CURRENT
   DISPLAY.WORLD
   VGRID SELECT.CURRENT
   CURRENT.OBJECT @
   LAST.SELECTED ! ;

 : WHEN.DOWN
  MOUSE.DOWN.RECORD 8 + @
  TICKCOUNT SWAP - ;


HEX 02F4 CONSTANT CARET.TIME DECIMAL

  CREATE EVENT.TO.FLASH 0 ,



 : FLASH.CURRENT              \ no longer shows lock state
 CURRENT.HANDLE  IF
    TICKCOUNT
    SELECT.CURRENT
  DISPLAY.OBJECT            \ show hilited object
    BEGIN
        DUP TICKCOUNT SWAP -
        CARET.TIME @   >        \ wait at least caret.time ticks
        MOUSE.BUTTON OR         \ or until button is down
    UNTIL DROP
  TICKCOUNT
  SELECT.CURRENT
    DISPLAY.OBJECT            \ unlite object
  BEGIN
        DUP TICKCOUNT SWAP -       \ wait at least flash time ticks
        CARET.TIME @   >
        MOUSE.BUTTON OR         \ or until button is down
    UNTIL DROP
  THEN  ;


 : (FLASH.SELECTED)           \ flashes current object once
 CURRENT.OBJECT @ WORLD.OBJECT > IF
  MOUSE.BUTTON NOT  IF       \ if not world or mouse button
    EVENT.TO.FLASH @ 4 > IF
      0  EVENT.TO.FLASH !
      FLASH.CURRENT
    ELSE
      EVENT.TO.FLASH @ 1+
      EVENT.TO.FLASH !
    THEN
  THEN
 THEN  ;

  FIND  (FLASH.SELECTED)  ' ^(FLASH.SELECTED) !

 : FLASH.SELECTED ^(FLASH.SELECTED) EXECUTE ;

: DRAW.OVERLAY SHOW.SELECTED ;

 VARIABLE WIN.RECT  8 ALLOT

: WRECT
  GET.WINDOW 16 - >R  R@ @ WIN.RECT !
  R@  4 + w@ 10 -  WIN.RECT 4 -  W!
```

```
  R>  6 + w@        WIN.RECT 6 -  W! ;

: OUTSIDE.BOUNDS
  WRECT XY>POINT DUP WIN.RECT
  PTINRECT NOT >R
  WORK.SPACE.RECT
  PTINRECT NOT R> OR ;


\  undo buffer and handler

 CODE NDROP
   D0 POP, D0 SP LONG ADDA,
 NEXT END-CODE

 : NULL.UNDO  ;



 6 202 CreateResString "UNDO      \ " Undo"
 7 202 CreateResString "UNDO.MOVE     \ " Undo Move"
 8 202 CreateResString "UNDO.NEW    \ " Undo New Object"
 9 202 CreateResString "UNDO.DUP      \ " Undo Duplicate"
 11 202 CreateResString  "UNDO.DRAWING   \ " Undo Drawing"
 12 202 CreateResString  "UNDO.DELETE  \ " Undo Clear"
 13 202 CreateResString  "UNDO.UNLINK  \ " Undo Un-Link"
 14 202 CreateResString  "UNDO.LINK    \ " Undo Link"
 15 202 CreateResString  "UNDO.PASTE   \ " Undo Paste"
 16 202 CreateResString  "UNDO.EDIT      " Undo Edit "
 17 202 CreateResString  "UNDO.UNDO    \ " Undo Undo"
 18 202 CreateResString  "UNDO.ZOOM    \ " Undo Zoom"
 19 202 CreateResString  "UNDO.WORLD.MOVE  \ " Undo World Move"
 20 202 CreateResString  "UNDO.FORM    \ " Undo Form Change"
 21 202 CreateResString  "UNDO.PALETTE   \ " Undo Palette Color"
 22 202 CreateResString  "UNDO.COLOR   \ " Undo Color Change "

 : SET.UNDO$
   LOCALS| UN.STRING |
   1 UN.STRING 3 SET.ITEMS
   1 TRUE 3 ITEM.ENABLE ;


   VARIABLE OBJECT.SCRAP  RECORD.LENGTH TYPE.RECORD - ALLOT
   CREATE UN.OBJECT  WORLD.OBJECT ,
 CREATE UN.UN.OBJECT WORLD.OBJECT ,
 CREATE UN.LENGTH  RECORD.LENGTH ,
   VARIABLE UN.^OBJECT
 CREATE MOST.CURRENT WORLD.OBJECT ,
   CREATE LAST.CURRENT WORLD.OBJECT ,
 NULL.TOKEN CONSTANT ^UNDO.MOVE
   FIND NULL.UNDO  CONSTANT ^NULL.UNDO
   CREATE DOUBLE.TOKEN  ^NULL.UNDO ,
  ^NULL.UNDO  UNDO.TOKEN !


: RESET.UNDO
  CURRENT.OBJECT @ >R         \ save the current object
  LAST.OBJECT SET.CURRENT.OBJECT   \ set the scrap object as current
  OBJECT.STATE PLUCK IF
   DELETE.OBJECT.RECORD      \ If its there, delete it.
  THEN
  R> SET.CURRENT.OBJECT        \ restore the current object
  ^NULL.UNDO UNDO.TOKEN !      \ set the undo to null
  1 "UNDO 3 SET.ITEMS        \ use default undo
```

```
 1 FALSE 3 ITEM.ENABLE ;          \ disable the undo item


: SET.UNDO.SIZE
CURRENT.OBJECT @
SIZE.OF.CURRENT.RECORD
0 LOCALS| N.SIZE C.SIZE C.OBJECT
LAST.OBJECT SET.CURRENT.OBJECT
SIZE.OF.CURRENT.RECORD TO N.SIZE
C.OBJECT SET.CURRENT.OBJECT
N.SIZE C.SIZE  = NOT IF
  N.SIZE RESIZE.RES.RECORD
ELSE -1  THEN  ;


: UNDO.OBJECT UNDO.TOKEN @ EXECUTE ;


 : UNDO.CHANGE                      \ sensitive to fixed length record
  CURRENT.OBJECT @
 0 0 LOCALS| TEMP.HANDLE C.SIZE C.OBJECT         \ declare locals
 LAST.OBJECT SET.CURRENT.OBJECT           \ set object to last
 RES.STATE PLUCK UNUSED > IF             \ if last exists
  0 TO ERROR.FLAG
  UN.OBJECT @ SET.CURRENT.OBJECT           \ set current to  undo object
  CURRENT.SIZE TO C.SIZE               \ set size local
  OBJECT.STATE PLUCK UNUSED > IF            \ if undo object exists...
      OBJECT.RECT PLUCK               \ save the object rect
    C.SIZE FROM.HEAP
    TO TEMP.HANDLE
    TEMP.HANDLE IF
      CURRENT.HANDLE @ TEMP.HANDLE @
      C.SIZE CMOVE
      SET.UNDO.SIZE IF              \ resize the record if needed
        LAST.OBJECT SET.CURRENT.OBJECT
        OBJECT.RECORD DROP
        UN.OBJECT @ SET.CURRENT.OBJECT
        OBJECT.RECORD MOVE.RECORD      \ move the record
        LAST.OBJECT SET.CURRENT.OBJECT     \ set last object as current
        C.SIZE RESIZE.RES.RECORD       \ resize
        IF
          TEMP.HANDLE @ CURRENT.HANDLE @
          C.SIZE CMOVE
        ELSE
          RESET.UNDO
          -108 TO ERROR.FLAG
        THEN
      THEN
    TEMP.HANDLE TO.HEAP
    THEN
    UN.OBJECT @ SET.CURRENT.OBJECT
    OBJECT.RECT PLACE                   restore the original rect
    OBJECT.CHANGED
  THEN
  DO.ERROR.ALERT                  \ post an alert
  0 to error.flag
 THEN ;


 : NEW.SCRAP.RECORD
 CURRENT.RECORDS @              \ fetch current records from global
 0 0 LOCALS| N.HANDLE RES.ID C.RECORDS
 LAST.OBJECT TO RES.ID            \ set local
     C.RECORDS C.COUNT + @          \ fetch minimum count
```

```
  From.heap TO N.HANDLE          \ create handle and place in local
 N.HANDLE IF
  N.HANDLE C.RECORDS RES.ID      \ if handle is real
  TAB.OF !              \ store in tab for id
  1 C.RECORDS RES.ID TAB.OF 4+ !   \ set state to active
  RES.ID SET.CURRENT.OBJECT     \ set id as current
  C.RECORDS C.DEFAULT + )@  IF   \ if default exists
    C.RECORDS C.DEFAULT - )@  \ fetch address of default
    N.HANDLE @           \ fetch pointer to memory
    C.RECORDS C.COUNT + @      \ fetch minimum count
    CMOVE              \ block move
  THEN
 ELSE  NO.MORE  THEN          \ else handle error
 ;



: MARK.CHANGE             \ save current to undo scrap
 0 LOCALS| C.SIZE |
 OBJECT.STATE PLUCK IF
   ^UNDO.MOVE UNDO.TOKEN !
   CURRENT.OBJECT @  DUP UN.OBJECT !
  MOST.CURRENT !
  CURRENT.SIZE TO C.SIZE
   LAST.OBJECT SET.CURRENT.OBJECT
  CURRENT.HANDLE 0 = IF
   NEW.SCRAP.RECORD
  THEN
  CURRENT.OBJECT 0 = NOT IF
   CURRENT.SIZE C.SIZE = NOT IF        \ check the size
     C.SIZE RESIZE.RES.RECORD        \ resize if needed
   ELSE
     -1                    \ set ok flag
   THEN
  ELSE
    0
  THEN
  IF                        \ if resized ..
   UN.OBJECT @ SET.CURRENT.OBJECT
   OBJECT.RECORD DROP
   LAST.OBJECT SET.CURRENT.OBJECT
   OBJECT.RECORD MOVE.RECORD
   OBJECT.CHANGED
  ELSE
   -108 TO ERROR.FLAG
   DO.ERROR.ALERT
   RESET.UNDO
  THEN
  UN.OBJECT @ SET.CURRENT.OBJECT
 THEN ;



\ mouse interface utilities

 : >3POS
   CURRENT.V.TOOL @
  ZY.ARROW  =  IF
   0 SWAP -1 * ELSE  0 THEN ;

: SHIFT.DOWN  EVENT.RECORD MODIFY  4 AND 4 =  ;
```

```
: COMMAND/OPTION.DOWN
  EVENT.RECORD MODIFY DUP 16 AND 16 - SWAP 2 AND 2 - OR ;

: COMMAND.DOWN
  EVENT.RECORD MODIFY 2 AND 2 =  ;

 FIND  COMMAND.DOWN CONSTANT ^COMMAND.DOWN

: OPTION.DOWN
  EVENT.RECORD MODIFY 16 AND 16 -  ;

 FIND OPTION.DOWN  CONSTANT ^OPTION.DOWN

: ANY.DOWN  EVENT.RECORD MODIFY 22 AND 0> ;


: MOVE/CLICK                \ Loops until move or click
  @MOUSE
    BEGIN
      DUP @MOUSE = NOT       \ if not - its a move
    MOUSE.BUTTON OR          \ mouse.button or move for ending loop
    UNTIL  DROP ;            \ drop the packed point

 : MOVE/UNCLICK               \ Loops until move or click
  @MOUSE
    BEGIN
      DUP @MOUSE = NOT        \ if not = its a move
    MOUSE.BUTTON NOT OR       \ mouse.button or move for ending loop
    UNTIL  DROP ;            \ drop the packed point


: MOVE/UP.SHIFT
   @MOUSE BEGIN
   DO.EVENTS DROP DUP @MOUSE -
     SHIFT.DOWN  AND
     MOUSE.BUTTON AND
 WHILE REPEAT DROP ;


: MOVE/UP.OPTION
  @MOUSE BEGIN
   DO.EVENTS DROP DUP
     @MOUSE =
   COMMAND/OPTION.DOWN AND
   MOUSE.BUTTON AND
     WHILE REPEAT DROP ;



: MOVE/ANY.DOWN
  @MOUSE BEGIN
   DO.EVENTS DROP DUP
   @MOUSE =
     ANY.DOWN NOT AND
   MOUSE.BUTTON AND
 WHILE REPEAT DROP ;

 \ SCALE.TOOL
```

```
POSITION.LOCK ATT.LOCK - CONSTANT ALL.LOCKED

: MOUSE.SCALE.FACTOR
 512 *  ;

: UPDATE.SCALE
      SRMOUSEXY@ SWAP DROP DUP
      0  =  IF DROP ELSE
  MOUSE.SCALE.FACTOR
      TEMP.DELTA.SCALE @ +
      DELTA.SCALE !
      DISPLAY.DELTA.CHANGE
  SHOW.CURSOR   THEN ;


: DO.SCALE.TOOL
    MOUSE.DOWN IF
  GET.OBJECT
  SET-UP.CURSOR
      SET.SRMOUSE
      DELTA.SCALE @ TEMP.DELTA.SCALE !
      @MOUSEXY
      BEGIN DO.EVENTS DROP
      MOUSE.BUTTON
  SHIFT.DOWN
  CURRENT.V.TOOL @ SCALE.TOOL = OR AND
  WHILE
    MOVE/UNCLICK
        UPDATE.SCALE
      REPEAT
      RESET.MOUSE
    THEN ;



: UN.LOCKED.SCALE.CLIMB        \ climb up tree till not position locked
  BEGIN
    UP.TREE PLUCK
  SET.CURRENT.OBJECT          \ up one level
    LINK.TYPE  PLUCK
    ALL.LOCKED AND
    ALL.LOCKED = NOT           \   is it not locked  ?
    CURRENT.OBJECT @
    WORLD.OBJECT =            \   or the world ?
  OR UNTIL  ;


: SCALE.^CURSOR             \ translates next unlocked object up tree
     CURRENT.OBJECT @          \ save current object
     UN.LOCKED.SCALE.CLIMB       \ up until unlocked  or world
     CURRENT.OBJECT @
     WORLD.OBJECT = NOT IF       \ lets not move the world
        OBJECT.LEVEL PLUCK       \ check for lowest level
        MOVER.LEVEL @ < IF
          CURRENT.OBJECT @ MOVER !
        THEN                 \ set mover for redraw
    "UNDO.MOVE SET.UNDOS
    MARK.CHANGE          \ set undos for current object
        DO.SCALE.TOOL          \ do input from user
     THEN
     SET.CURRENT.OBJECT        \ reset to original object down the tree
     GET.OBJECT             \ fetch full object vars
```

```
    SET-UP.CURSOR  ;           \ init cursor for original object


:   (SCALE.POLY.CURSOR)         \ mouse interface for attitude change
     LINK.TYPE  PLUCK
       ALL.LOCKED AND
       ALL.LOCKED = NOT IF
         DO.SCALE.TOOL
         ELSE
         SCALE.^CURSOR
       THEN  ;

 FIND (SCALE.POLY.CURSOR) constant ^SCALE.TOOL


 : SCALE.CURSOR
      SHIFT.DOWN IF
    DISPLAY.V.TOOLS
    SCALE.TOOL (HILITE.V.TOOL)
        (SCALE.POLY.CURSOR)
    HILITE.V.TOOL
      THEN ;


( RMOUSEXY@ )                                ( 120186 YH )


 CODE DSWAP
   DO POP,
   DO SWAP,
   DO PUSH,
 NEXT END-CODE

 : @MOUSEX  @MOUSE EXT ;

 : @MOUSEY  @MOUSE DSWAP EXT ;

 VARIABLE ATT.INT  10 ATT.INT !
   VARIABLE TEMP.YAW
 VARIABLE TEMP.PITCH
 VARIABLE TEMP.ROL


  : GET.CURVALS
    CURSOR.ACOS COS.LENGTH COS.PLUCK
    ANGLE CURYAW !
  ANGLE CURPITCH !
  ANGLE CURROL !  ;

  : GET.DELTA
    DELTA.COS COS.LENGTH COS.PLUCK
    ANGLE DELTA.YAW   W!
    ANGLE DELTA.PITCH W!
    ANGLE DELTA.ROL   W!  ;


  : NIL.ATTITUDE ;
  FIND NIL.ATTITUDE CONSTANT ^NIL.ATTITUDE    \ does nothing

  : NIL.KEY  -1  ;                    \ says yes
```

```
FIND NIL.KEY CONSTANT ^NIL.KEY

CREATE  ^ATT.KEY  ^NIL.KEY ,           \ created to do nothing
CREATE  ^Y.ATTITUDE ^NIL.ATTITUDE ,
CREATE  ^X.ATTITUDE ^NIL.ATTITUDE ,

: PITCH.UPDATE
    @MOUSEY  AMOUSE.DOWN@ W@ EXT - angle.scale 2/ *
      TEMP.DELTA.PITCH W@ EXT - DELTA.PITCH W! ;

: ROL.UPDATE
    @MOUSEY AMOUSE.DOWN@ W@  EXT  - angle.scale 2/ *
      TEMP.DELTA.ROL W@ EXT + DELTA.ROL W! ;

: YAW.UPDATE
    @MOUSEX AMOUSE.DOWN@ 2+ W@ EXT  - angle.scale 2/ *
      TEMP.DELTA.YAW W@ EXT + DELTA.YAW W! ;


FIND PITCH.UPDATE CONSTANT ^PITCH.UPDATE
FIND   ROL.UPDATE CONSTANT   ^ROL.UPDATE
FIND   YAW.UPDATE CONSTANT   ^YAW.UPDATE

: MOVE/ATT.KEY
  @MOUSE BEGIN
  DO.EVENTS DROP DUP
    @MOUSE =
  ^ATT.KEY @ EXECUTE AND
  MOUSE.BUTTON AND
    WHILE REPEAT DROP  ;


 : UPDATE.ATTITUDE                 \ updates attitude
    MOVE/ATT.KEY
   ^Y.ATTITUDE @ EXECUTE
  ^X.ATTITUDE @ EXECUTE  ;


: >DELTA.COS
   DELTA.ROL W@     EXT  ROL
   DELTA.PITCH W@ EXT PITCH
   DELTA.YAW W@   EXT  YAW
   COSINES DELTA.COS COS.LENGTH CMOVE ;


: ATTITUDE.CURSOR
    GET.OBJECT
    SET-UP.CURSOR           \ init relative mouse
    GET.DELTA
  SET.ARMOUSE
    DELTA.YAW   W@ TEMP.DELTA.YAW   W!
    DELTA.ROL   W@ TEMP.DELTA.ROL   W!
    DELTA.PITCH W@ TEMP.DELTA.PITCH W!
  @MOUSEXY >R
    BEGIN DO.EVENTS DROP
          ^ATT.KEY @ EXECUTE
      MOUSE.BUTTON AND WHILE
            ARMOUSEXY@ 0= SWAP 0= AND NOT IF
            MOVE/ATT.KEY
            UPDATE.ATTITUDE
            >DELTA.COS
      DISPLAY.DELTA.CHANGE
      LIMIT? @ IF
```

```
        GET.OBJECT
        SET-UP.CURSOR
        ZERO.DELTA.VARS
        DELTA.YAW   W@ TEMP.DELTA.YAW   W!
          DELTA.ROL   W@ TEMP.DELTA.ROL   W!
          DELTA.PITCH W@ TEMP.DELTA.PITCH W!
        SET.ARMOUSE
      THEN
      THEN
    REPEAT
   R> RESET.MOUSE  ;


( SET-UP.CURSOR )                                    ( 120186 YH )


: UN.LOCKED.ATT.CLIMB          \ climb up tree till not position locked
  BEGIN
    UP.TREE PLUCK
  SET.CURRENT.OBJECT         \ up one level
    LINK.TYPE  PLUCK
    ATT.LOCK AND
    ATT.LOCK = NOT           \   is it not locked  ?
    CURRENT.OBJECT @
    WORLD.OBJECT =           \   or the world ?
  OR UNTIL  ;


: ATTITUDE.^CURSOR           \ translates next unlocked object up tree
     CURRENT.OBJECT @          \ save current object
     UN.LOCKED.ATT.CLIMB        \ up until unlocked attitude or world
     CURRENT.OBJECT @
     WORLD.OBJECT = NOT IF      \ lets not move the world
        OBJECT.LEVEL PLUCK      \ check for lowest level
        MOVER.LEVEL @ < IF
          CURRENT.OBJECT @ MOVER !
        THEN                 \ set mover for redraw
    "UNDO.MOVE SET.UNDOS
    MARK.CHANGE           \ set undo for current object
        ATTITUDE.CURSOR        \ do input from user
     THEN
     SET.CURRENT.OBJECT        \ reset to original object down the tree
     GET.OBJECT              \ fetch full object vars
     SET-UP.CURSOR  ;          \ init cursor for original object


:   (ATT.POLY.CURSOR)          \ mouse interface for attitude change
     LINK.TYPE  PLUCK
       ATT.LOCK AND
       ATT.LOCK = NOT IF
         ATTITUDE.CURSOR
         ELSE
         ATTITUDE.^CURSOR
       THEN  ;

  FIND (ATT.POLY.CURSOR) CONSTANT ^ATT.POLY.CURSOR

  :   ATT.POLY.CURSOR          \ mouse interface for attitude change
      COMMAND.DOWN IF
```

```
DISPLAY.V.TOOLS
YAW.ARROW    (HILITE.V.TOOL)
PITCH.ARROW (HILITE.V.TOOL)
  ^YAW.UPDATE ^X.ATTITUDE !       \ set tokens for generic attitude update
    ^PITCH.UPDATE ^Y.ATTITUDE !
  ^COMMAND.DOWN ^ATT.KEY !
(ATT.POLY.CURSOR)
HILITE.V.TOOL
THEN
  OPTION.DOWN IF
DISPLAY.V.TOOLS
YAW.ARROW (HILITE.V.TOOL)
ROL.ARROW (HILITE.V.TOOL)
  ^YAW.UPDATE ^X.ATTITUDE !
    ^ROL.UPDATE ^Y.ATTITUDE !
  ^OPTION.DOWN ^ATT.KEY !
(ATT.POLY.CURSOR)
HILITE.V.TOOL
  THEN ;


\ X Y Z  translation for mouse


: UN.LOCKED.CLIMB              \  climb up tree till not position locked
  BEGIN
    UP.TREE PLUCK
  SET.CURRENT.OBJECT           \  up one level
    LINK.TYPE  PLUCK
    POSITION.LOCK AND
    POSITION.LOCK = NOT          \  is it not locked  ?
    CURRENT.OBJECT @
    WORLD.OBJECT =             \  or the world ?
  OR UNTIL  ;                \ leaves current object set to unlocked



  : TRANS.OBJECT
      GET.OBJECT
      SET-UP.CURSOR              \ init relative mouse
        BEGIN DO.EVENTS DROP
           ANY.DOWN NOT            \ while no control keys are down
           MOUSE.BUTTON AND WHILE        \ while the mouse button is down ..
           RMOUSEXY@
           >3POS
           DELTA.3POS 12 LPLACE
           DISPLAY.DELTA.CHANGE     \ translate and display
       LIMIT? @ IF
         GET.OBJECT
         SET-UP.CURSOR
       THEN
     MOVE/ANY.DOWN
   REPEAT  ;


  : TRANS.^OBJECT               \ translates next unlocked object up tree
     CURRENT.OBJECT @
      UN.LOCKED.CLIMB             \ up until unlocked or world
      CURRENT.OBJECT @
      WORLD.OBJECT = NOT IF
         OBJECT.LEVEL PLUCK          check for lowest level
```

```
      MOVER.LEVEL @ < IF
        CURRENT.OBJECT @ MOVER !    \ set most parent for redraw
      THEN
  "UNDO.MOVE SET.UNDOS
      MARK.CHANGE
      TRANS.OBJECT
   THEN
   SET.CURRENT.OBJECT          \ reset to original object down the tree
   GET.OBJECT
   SET-UP.CURSOR  ;            \ init cursor for original object



( TRANS.POLY.CURSOR UPDATE.POLY.CURSOR )          ( 113086 YH )

 : NTRANS.POLY.CURSOR             \ translates cursor
   ANY.DOWN NOT IF           \ move if no special keys
     LINK.TYPE  PLUCK
     POSITION.LOCK AND
     POSITION.LOCK = NOT IF        \ if not locked, ordinary move
        TRANS.OBJECT
     ELSE
        TRANS.^OBJECT             \ else chain up the tree for move
     THEN
   THEN ;


( UPDATE.POLY.CURSOR )                            ( 100386 YH )

 :  UPDATE.POLY.CURSOR
     -1 DRAW.CHECK !
      NTRANS.POLY.CURSOR
      ATT.POLY.CURSOR
      SCALE.CURSOR
      MOVE/CLICK  ;         ( wait for move or click  )



 : UNDRAW.POLY.CURSOR              (    undraws last poly cursor)
   DRAW.CHECK @ IF                 ( if undraw flag is set      )
   0 DRAW.CHECK !   HIDE.CURSOR    ( set flag nil, hide cursor )
   RE.TOGGLE REDRAW CLEAR.REDRAW   ( toggle to last redraw      )
   SHOW.CURSOR THEN ;              ( show cursor )



 :  DOWN.DATE.POLY.CURSOR
    -1 DRAW.CHECK !
     NTRANS.POLY.CURSOR
     ATT.POLY.CURSOR
     SCALE.CURSOR
     MOVE/UNCLICK  ;           \ wait for move or unclick



( GROUP.CURSORS , DISPLAYS WIRE FRAME CURSOR )     ( 081686 YH )

0  CONSTANT ^OBJECT.CURSORS
```

```
 : OBJECT.CURSORS
 HIDE.CURSOR
 USE.CUBE?
   OBJECT.RCUBE
   CUBE.BOUNDS SWAP MOVE.RECORD
   DOWN.DATE.POLY.CURSOR
 SHOW.CURSOR ;

FIND OBJECT.CURSORS ' ^OBJECT.CURSORS !


: ABSOLUTE.REDRAW.OBJECT
      CLEAR.TREE.RECT
      PUT.OBJECT
      SET.RELATIVE
      SET.ABSOLUTE
      MOVING SET.TREE.STATE
      N.DRAW.WORLD
      ACTIVE SET.TREE.STATE
      DRAW.TREE   ;


  : DO.UNLINK            \ unlinks the object
    ALL.FREE
    DUP GLOBAL.LINK W!
    DUP CURRENT.LINK W!
    LINK.TYPE PLACE
    CUT.OBJECT
    WORLD.OBJECT
    UP.TREE PLACE
    INSERT.OBJECT
    SET.RELATIVE
    OBJECT.CHANGED  ;

0 CONSTANT ^UNDO.LINK

  : UNDO.UNLINK
    UN.OBJECT @ SET.CURRENT.OBJECT
    CUT.OBJECT
    UNDO.CHANGE
    INSERT.OBJECT          \ insert child
    SET.RELATIVE         \ set relative position
    "UNDO.LINK SET.UNDOS
    ^UNDO.LINK UNDO.TOKEN !  ;

  FIND UNDO.UNLINK CONSTANT ^UNDO.UNLINK


  : UNLINKER
    @MOUSE.DN POINT>XY
            SELECT.OBJECT?
            ONLY.OBJECT.SELECTED IF
        "UNDO.UNLINK SET.UNDOS
             MARK.CHANGE
         ^UNDO.UNLINK UNDO.TOKEN !
                DO.UNLINK
                REVERT.V.TOOL       \ revert if caps lock is up
        SET.V.CURSORS
          THEN   ;


  : UNDO.LINK
```

```
    UN.OBJECT @ SET.CURRENT.OBJECT
    CUT.OBJECT
    UNDO.CHANGE
    INSERT.OBJECT              \ insert child
    SET.RELATIVE             \ set relative position
      "UNDO.UNLINK SET.UNDO$
    ^UNDO.UNLINK UNDO.TOKEN ! ;

  FIND UNDO.LINK  ' ^UNDO.LINK !


CREATE ^PROTO.TOOL ^NIL.ATTITUDE ,

:   PROTO.TOOL
      @MOUSE.DN POINT>XY
             SELECT.OBJECT?
             ONLY.OBJECT.SELECTED IF
         OBJECT.FORM PLUCK PICT.FORM < IF
         MOST.CURRENT @
         LAST.CURRENT !
         CURRENT.OBJECT @
         MOST.CURRENT !
         MOVE/UNCLICK
                 MOUSE.BUTTON IF
            CURRENT.OBJECT @ MOVER !
            OBJECT.LEVEL PLUCK MOVER.LEVEL !
          "UNDO.MOVE SET.UNDO$
                MARK.CHANGE
                  GET.OBJECT
                    SET-UP.CURSOR
                  BEGIN
             DO.EVENTS DROP
                         STILL.DOWN WHILE
                      ^PROTO.TOOL @ EXECUTE
                  REPEAT
                    MOVER @ SET.CURRENT.OBJECT
          GET.OBJECT
          REDRAW.OBJECT
                  UNDRAW.POLY.CURSOR
                  CLEAR.REDRAW
          REVERT.V.TOOL        \ revert if caps lock is up
          SET.V.CURSORS
          DISPLAY.WORLD
          THEN
               THEN
      THEN  UNDRAW.POLY.CURSOR  ;


: MAKE.LINK
 LOCALS| L.CHILD L.PARENT |                 \ parent, child ---
       L.PARENT SET.CURRENT.OBJECT            \ set parent as current
     L.CHILD NOT.RECURSOR IF              \ test for recursion
         SHOW.SELECTED              \ flash the parent
               L.CHILD   SET.CURRENT.OBJECT      \ set child current
         MARK.CHANGE
         "UNDO.LINK SET.UNDO$         \ set undo string
           ^UNDO.LINK UNDO.TOKEN !        \ mark a change
         CURRENT.OBJECT @ UN.OBJECT !
               CUT.OBJECT               \ cut out child
         L.PARENT
         UP.TREE  PLACE             \ place new parent
               INSERT.OBJECT              \ insert child
```

```
      SET.RELATIVE              \ set relative position
      GLOBAL.LINK W@             \ set link type
      LINK.TYPE PLACE
      OBJECT.CHANGED
    ELSE 10 SYSBEEP THEN          \ recursor selected...
  ;


: DO.LINK                      \ link object tool
 0 0 LOCALS| L.PARENT L.CHILD |          \ define locals
  @MOUSE.DN POINT>XY   SELECT.OBJECT? IF
  CURRENT.OBJECT @
    TO L.CHILD
      SHOW.SELECTED                  \ flash the child
    @MOUSE.DN POINT>XY
    STRETCH.LINE                  \ stretch the line
  @MOUSE POINT>XY OUTSIDE.BOUNDS NOT IF        \ if in bounds
        SELECT.OBJECT? IF            \ and an object selected
      CURRENT.OBJECT @ TO L.PARENT
          L.PARENT L.CHILD MAKE.LINK        \ recursor selected...
      ELSE 10 SYSBEEP THEN            \ no parent selected
  ELSE 10 SYSBEEP THEN              \ out of bounds
    GET.OBJECT
      SHOW.SELECTED
    DISPLAY.WORLD                  \ display the link
  ELSE 10 SYSBEEP THEN                \ no child selected
 REVERT.V.TOOL                  revert if caps lock is up
 SET.V.CURSORS ;


CREATE LAST.LOCK.STATE  0 ,

 : SET.DEFAULT.TOOL
   XY.ARROW DEFAULT.V.TOOL !  ;


   CREATE  H.PIXEL.PAGE 1024 ,           \ half the current page horiz.
   CREATE  V.PIXEL.PAGE  660 ,           \ half the current page vert.
   CREATE  H.SCROLL.OFFSET 0 ,
 CREATE  V.SCROLL.OFFSET 0 ,

 15  ' SCROLL.WIDTH !                \ correct scroll constant


 : SET.SCROLL                     \ sets the scroll from world object's position
 CURRENT.OBJECT @                 \ save the current object
 0 0 0 LOCALS| - TEMP W.X W.Y C.OBJECT
 GET.WINDOW +HBAR @ 0 100 SET.CONTROL.RANGE
 GET.WINDOW +VBAR @ 0 100 SET.CONTROL.RANGE
 ZBUFFERY @ 2*  V.PIXEL.PAGE !            \ set to 4* the total screen
 ZBUFFERX @ 2*  H.PIXEL.PAGE !
 0 H.SCROLL.OFFSET !
 0 V.SCROLL.OFFSET !
 WORLD.OBJECT SET.CURRENT.OBJECT          \ set world as current
 OBJECT.R3POS PLUCK FIX>INTEGER DROP
  TO W.Y TO W.X                  \ convert world x y to integer
  H.PIXEL.PAGE @ DUP 4/ - TO TEMP        \ temp is 3/4 of half the horiz page
  W.X  TEMP  > IF                \ if x is greater then temp
     W.X TEMP - H.SCROLL.OFFSET !         \ set x to temp and calc offset
     TEMP TO W.X
  THEN
```

```
W.X  TEMP NEG  < IF                \ if x is less than -temp
   W.X TEMP + H.SCROLL.OFFSET !         \ set x to minus temp and calc offset
   TEMP NEG TO W.X
THEN
V.PIXEL.PAGE @ DUP 4/ - TO TEMP         \ temp is 3/4 of half the vert page
W.Y  TEMP  > IF                    \ if y is greater than temp..
   W.Y TEMP - V.SCROLL.OFFSET !         \ set y to temp and calc offset
   TEMP TO W.Y
THEN
W.Y  TEMP NEG  < IF                \ if y is less than -temp
   W.Y TEMP + V.SCROLL.OFFSET !         \ set y to temp and
   TEMP NEG TO W.Y                \ calc offset
THEN
W.X  50  H.PIXEL.PAGE @ */  TO W.X          \ scale current position to scroll units
W.Y  50  V.PIXEL.PAGE @ */  TO W.Y
  50 W.X - !HPOS                  \ scroll is 0 to 100 ...
  50 W.Y - !VPOS
WORLD.OUTPUT SHOW.CONTROLS
C.OBJECT SET.CURRENT.OBJECT  ;


: UPDATE.SCROLL.ACTION               \ updates world position from scroll settings
OBJECT.R3POS PLUCK                 \ fetch world position
>R 2DROP                        \ save the z drop the rest
  50 @HPOS  -
H.PIXEL.PAGE @ 50 */               \ convert x from scroll to pixel
H.SCROLL.OFFSET @ +
50 @VPOS -
V.PIXEL.PAGE @ 50 */               \ convert y from scroll to pixel
V.SCROLL.OFFSET @ +
0 INTEGER>FIX DROP                 \ convert from integer to fixed
R>                          \ restore z
3DUP
OBJECT.A3POS PLACE                 \ place in world
OBJECT.R3POS PLACE
OBJECT.CHANGED
-1 DRAW.CHECK !                   \ set flag for undrawing
GET.OBJECT                     \ fetch the object
DISPLAY.WORLD.CURSOR  ;              \ display cursor


 : INC.VSCROLL                   \ increment the scroll n --
  @VPOS + 0 MAX 100 MIN !VPOS
  LAST.PART UPDATE.CONTROL
  UPDATE.SCROLL.ACTION
  0 UPDATE.CONTROL ;

 : INC.HSCROLL                   \ increment the scroll n --
  @HPOS + 0 MAX 100 MIN !HPOS
  LAST.PART UPDATE.CONTROL
  UPDATE.SCROLL.ACTION
  0 UPDATE.CONTROL ;

  : DO.VSCROLL                   \ continued scrolling by n --
  BEGIN
     MOUSE.BUTTON WHILE
     DUP INC.VSCROLL
  REPEAT DROP ;


  : DO.HSCROLL                   \ continued scrolling by n --
```

```
 BEGIN
    MOUSE.BUTTON WHILE
    DUP INC.HSCROLL
 REPEAT DROP ;

: DO.SCROLL                    \ scroll.type , increment -- does it
  SWAP
  CASE
    SCROLL.UP/DOWN     OF DO.VSCROLL ENDOF
    SCROLL.LEFT/RIGHT OF DO.HSCROLL ENDOF
  ENDCASE ;


: DO.THUMB
  FOLLOW.MOUSE DROP
  GET.WINDOW
  SHOW.CONTROLS
 CASE
    SCROLL.UP/DOWN     OF
     UPDATE.SCROLL.ACTION ENDOF
    SCROLL.LEFT/RIGHT OF
     UPDATE.SCROLL.ACTION ENDOF
  ENDCASE ;

: HANDLE.SCROLL

 CASE
      IN.THUMB     OF      DO.THUMB  ENDOF
      UP.BUTTON    OF -1  DO.SCROLL ENDOF
      DOWN.BUTTON OF  1  DO.SCROLL ENDOF
  PAGE.UP      OF -2  DO.SCROLL ENDOF
      PAGE.DOWN    OF  2  DO.SCROLL ENDOF
  ENDCASE  ;


: DO.CONTROLS
  IN.SCROLL.BAR? IF
  CURRENT.OBJECT @ >R
  WORLD.OBJECT SET.CURRENT.OBJECT
  OBJECT.R3POS PLUCK  >R >R >R
     HANDLE.SCROLL
  OBJECT.R3POS PLUCK R> R> R>
  SUB.3POS 0= >R 0= >R 0= R> AND R> AND  NOT IF
    GET.OBJECT
    SET.RELATIVE
    REDRAW.OBJECT
    OBJECT.CHANGED
  THEN
  UNDRAW.POLY.CURSOR
  CLEAR.REDRAW
  DISPLAY.WORLD
  R> SET.CURRENT.OBJECT
  INIT.CURSOR
THEN ;



( SAVE.CONTOURS GET.CONTOURS SAVE.WORLD )          ( 120186 YH )


: REDRAW.WORLD
```

```
WORLD.OBJECT SET.CURRENT.OBJECT
GET.OBJECT REDRAW.OBJECT
DISPLAY.WORLD.OUTPUT  ;



( SET.WORLD.SCALE PRINT.WORLD GET.WORLD )          ( 101686 YH )

: SET.WORLD.SCALE
  SET.SCALE  CURRENT.OBJECT @
  WORLD.OBJECT SET.CURRENT.OBJECT
  SC @ OBJECT.SCALE PLACE
  OBJECT.CHANGED
  SET.CURRENT.OBJECT   ;



( DELETE.OBJECT )                                   ( 101386 YH )

 0 CONSTANT ^DELETE.OBJECT
 0 CONSTANT ^UN.DELETE.OBJECT


 :  (DELETE.OBJECT)          \ deletes un.object
    ^UN.DELETE.OBJECT UNDO.TOKEN !    \ set undo.token for un.delete
  "UNDO.DELETE SET.UNDO$
  CLEAR.MOVING             \ clear other moving objects
    UN.OBJECT @ SET.CURRENT.OBJECT      un.object is current.object
    CURRENT.OBJECT @ WORLD.OBJECT > IF \ greater than world
    CLEAR.TREE.RECT           \ clear old image
    MOVING SET.TREE.STATE        \ set state of object tree to moving
    N.DRAW.WORLD            \ redraw all intersecting objects
    CUT.OBJECT              \ remove object from linking
    DISPLAY.WORLD.OUTPUT       \ display world to current output window
    WORLD.OBJECT
    SET.CURRENT.OBJECT         \ set world as current object
    THEN ;


 :  DELETE.OBJECT
    CURRENT.OBJECT @  UN.OBJECT !      \ set un.object and delete
    (DELETE.OBJECT) ;


 :  UN.DELETE.OBJECT            \ re-links, sets active, and redraws
    ^DELETE.OBJECT UNDO.TOKEN !     \ set delete.object as undo.token
  "UNDO.NEW SET.UNDO$
  UN.OBJECT @ SET.CURRENT.OBJECT   \ set.current.object to un.object
    CURRENT.OBJECT @ WORLD.OBJECT > IF \ if greater than world object
    ACTIVE SET.ANY.TREE.STATE      \ set object's tree active
    INSERT.OBJECT            \ re-insert object
    DRAW.TREE              \ draw the object and it's tree
    DISPLAY.WORLD.OUTPUT       \ display world to current output window
    WORLD.OBJECT            \ set world as current object
    SET.CURRENT.OBJECT
    THEN ;


   FIND UN.DELETE.OBJECT  ' ^UN.DELETE.OBJECT !
   FIND (DELETE.OBJECT)   ' ^DELETE.OBJECT !
```

```
( CLONE.OBJECT )                                  ( 081986 YH )

VARIABLE  DUP.LIST LAST.OBJECT 4 *  ALLOT      \ Last Revision: 03/14/88  09:50:04 AM   YH
0 DUP.LIST ! 1 DUP.LIST 4+ !           \ fixed record size

 : CLEAR.DUP.LIST
 DUP.LIST LAST.OBJECT 4 * ERASE
 0 DUP.LIST ! 1 DUP.LIST 4+ !           \ fixed record size
 ;

GLOBAL FOUND.OBJECT

: MATCH.OBJECT?
    OBJECT.STRING TEMP.STRING 1- SWAP MOVE.RECORD
    20 TEMP.STRING C!
    TEMP.STRING PAD -STRING 0= IF
      CURRENT.OBJECT @ TO FOUND.OBJECT
    THEN ;

  FIND MATCH.OBJECT? CONSTANT ^MATCH.OBJECT?

: FIND.OBJECT              \ PAD MUST BE PRESET TO 20 LENGTH AND MATCH STRING
  CURRENT.OBJECT @
  OPERATION @
  LOCALS| C.OPERATION C.OBJECT
  WORLD.OBJECT SET.CURRENT.OBJECT
  0 TO FOUND.OBJECT
  ^MATCH.OBJECT? OPERATION !
  TRAVERSE.DOWN.TREE
  C.OBJECT SET.CURRENT.OBJECT
  C.OPERATION OPERATION !
  FOUND.OBJECT ;

create "object  ," Object"
create "object2 ," Object"

: add.object.number
  object.string drop
  1 locals| the.end the.string
  begin
    the.end 1+ to the.end
    the.string the.end + c@ 32 =
    the.end 20 = or
  until
  the.string the.end 1- + to the.end
  the.end c@
  ascii 9    <
  the.end c@
  ascii 0 1- > and if
    the.end c@ 1+ the.end c!
  else
    the.end c@ ascii 9  = if
      the.end 1- c@
      ascii 9    <
      the.end 1- c@
      ascii 0 1- > and if
        the.end 1- c@ 1+ the.end 1- c!
        ascii 0 the.end c!
      else
        ascii 1 the.end c!
```

```
      ascii 0 the.end 1+ c!
    then
  else
    ascii 2 the.end 1+ c!
  then
then ;


: patch.object.name
  Object.string drop "object2 1+ "object2 c@ cmove
  "object2 "object -string not if
    default.object.name
  else
    Object.string drop pad 1+ 20 cmove
    20 pad c!
    find.object if
      add.object.number
    then
  then
  ;


: CLONE.SIZED                       \ clones variable sized object
0 0 LOCALS| N.SIZE C.SIZE CLONE CLONED        \ declare locals
CLONED  SET.CURRENT.OBJECT             \ set to cloned object
SIZE.OF.CURRENT.RECORD TO N.SIZE         \ set new size of clone
CLONE SET.CURRENT.OBJECT             \ set clone as current
SIZE.OF.CURRENT.RECORD TO C.SIZE          \ c.size is clone old size
N.SIZE C.SIZE  = NOT IF              \ if they are not equal ...
  N.SIZE RESIZE.RES.RECORD           \ resize the clone
  0= IF
     DELETE.RES.RECORD              \ if unsuccessful then
     0 SET.CURRENT.RECORD           \ set result to 0
     -108 TO ERROR.FLAG
  THEN
THEN
CURRENT.RECORD @ 0 = NOT IF            \ if succesful sizing
  CLONED SET.CURRENT.RECORD            \ fetch the address of the cloned object
  OBJECT.RECORD DROP
  CLONE SET.CURRENT.RECORD           \ set clone to current
  OBJECT.RECORD MOVE.RECORD            \ move the record
  patch.object.name
THEN ;


: CLONE.OBJECT                      \ duplicates current.object
  CURRENT.OBJECT @
0 LOCALS| THE.CLONE CLONED.OBJECT
ERROR.FLAG -1 > IF
    GET.NEXT.OBJECT                 \ get a new object
    CURRENT.OBJECT @ TO THE.CLONE
  THE.CLONE WORLD.OBJECT > IF          \ if no memory error
    CLONED.OBJECT
    THE.CLONE
    CLONE.SIZED                   \ move object info to new object
    ERROR.FLAG  0 < IF
      0 TO THE.CLONE
    THEN
    ELSE  -108 TO ERROR.FLAG
        0 TO THE.CLONE
  THEN                             else set error flag
THEN
THE.CLONE CLONED.OBJECT
```

```
 0 MAX LAST.OBJECT MIN  4* DUP.LIST + !      \ place clone's id in dup.list
CLONED.OBJECT SET.CURRENT.OBJECT  ;


  FIND CLONE.OBJECT  CONSTANT ^CLONE.OBJECT


( UN.CLONE RECONCILE.CLONE )                     ( 100386 YH )


: RECONCILE.CLONE                    \ resolves links for a cloned object
  0 LOCALS| TEMP.O  |
  CURRENT.OBJECT @ WORLD.OBJECT > IF
  CURRENT.OBJECT @ OBJECT.INDEX PLACE
  UP.TREE PLUCK TO TEMP.O
  TEMP.O THE.END = NOT IF
   TEMP.O 4* DUP.LIST + @ TO TEMP.O
   TEMP.O META.WORLD > IF
     TEMP.O UP.TREE PLACE
   ELSE THE.END UP.TREE PLACE
   THEN
  THEN
  DOWN.TREE  PLUCK TO TEMP.O
  TEMP.O THE.END = NOT IF
   TEMP.O 4* DUP.LIST + @ TO TEMP.O
   TEMP.O META.WORLD > IF
     TEMP.O DOWN.TREE PLACE
   ELSE THE.END DOWN.TREE PLACE
   THEN
  THEN
  LEFT.TREE  PLUCK TO TEMP.O
  TEMP.O THE.END = NOT IF
   TEMP.O 4* DUP.LIST + @ TO TEMP.O
   TEMP.O META.WORLD > IF
     TEMP.O LEFT.TREE PLACE
   ELSE THE.END LEFT.TREE PLACE
   THEN
  THEN
  RIGHT.TREE PLUCK TO TEMP.O
  TEMP.O THE.END = NOT IF
   TEMP.O 4* DUP.LIST + @ TO TEMP.O
   TEMP.O META.WORLD > IF
     TEMP.O RIGHT.TREE PLACE
   ELSE THE.END RIGHT.TREE PLACE
   THEN
  THEN
  THEN  ;


  FIND  RECONCILE.CLONE  CONSTANT ^RECONCILE.CLONE


( CLONE.TREE  RECONCILE.TREE )                   ( 101586 YH )

: CLONE.TREE                 \ clones an entire tree
  CLEAR.DUP.LIST
  OPERATION @
  ^CLONE.OBJECT OPERATION !
  TRAVERSE.DOWN.TREE
  OPERATION ! ;

: RECONCILE.TREE               \ reconciles links for a cloned tree
  CURRENT.OBJECT @
```

```
  OPERATION @
  ^RECONCILE.CLONE OPERATION !
  TRAVERSE.DOWN.TREE
  OPERATION !
  SET.CURRENT.OBJECT  ;

( DUP.TREE )                                    ( 101386 YH )

VARIABLE DUP.3POS

CREATE THIS.PAIR  0 , 0 ,
CREATE LAST.PAIR  0 , 0 ,

:  CLIP.OFFSET
    3DUP
  ABS >R
  ABS >R
  ABS R> +
  R> +
    200 FIX.SCALE SCALE  > IF
    2DROP DROP
    40 FIX.SCALE SCALE 0 0
  THEN  ;


: SET.DUP.OFFSET                    ( adds offset to duplicate object )
  LAST.PAIR @ 1 >
  LAST.PAIR 4+ @ 1 > AND
  THIS.PAIR 4+ @
  LAST.PAIR @ =       AND IF        \ checks pairs for defining offset
  LAST.PAIR @ SET.CURRENT.OBJECT
  OBJECT.A3POS PLUCK                  \ fetch position of last pair
  LAST.PAIR 4+ @ SET.CURRENT.OBJECT
  OBJECT.A3POS PLUCK
  SUB.3POS                   \ last.pair.1 - last.pair.2
  THIS.PAIR @ SET.CURRENT.OBJECT        \ current object is duplicate
  ELSE
    40 FIX.SCALE SCALE 0 0 THEN       \ use default offset
  CLIP.OFFSET                \ clip if too large
  FIX.UP                     \ scale up for roundoff
  UP.TREE PLUCK SET.CURRENT.OBJECT     \ put offset in relative terms
  OBJECT.ACOS  COSINES SWAP MOVE.RECORD
  UN.SWIVEL
  OBJECT.SCALE PLUCK UN.SCALE.VECTOR
  THIS.PAIR @ SET.CURRENT.OBJECT
  FIX.DOWN                   \ scale down
  OBJECT.R3POS PLUCK             \ fetch current relative position
  ADD.3POS                   \ add offset
  OBJECT.R3POS PLACE  ;            \ store in current object


: DUP.TREE                   \ duplicates object and links
  0 TO ERROR.FLAG                \ set error.flag to no.error
 CLEAR.MOVING                \ clear moving objects
 RESET.UNDO
 CURRENT.OBJECT @ WORLD.OBJECT > IF     \ duplicate if > than world
   THIS.PAIR LAST.PAIR 8 CMOVE        \ maintain offset variables
   CURRENT.OBJECT @ THIS.PAIR 4+ !
   CLONE.TREE                    \ clone the object and links
   CURRENT.OBJECT @ 4* DUP.LIST + !
 DUP WORLD.OBJECT > IF
```

```
  SET.CURRENT.OBJECT
  RECONCILE.TREE             \ reconcile linking for each object
  ^DELETE.OBJECT UNDO.TOKEN !      \ set delete object as undo
  "UNDO.DUP SET.UNDO$
  CURRENT.OBJECT @ DUP UN.OBJECT !  \ set un.object for undo
    THIS.PAIR !              \ set current.object in this pair
      THE.END  RIGHT.TREE PLACE      \ set defaults for head object
    THE.END  LEFT.TREE PLACE
    WORLD.OBJECT UP.TREE PLACE
    INSERT.OBJECT
    ALL.FREE LINK.TYPE PLACE
      SET.RELATIVE            \ for proper attitude outside of link
      SET.DUP.OFFSET              \ set offset
  DRAW.TREE
ELSE DROP THEN
  ERROR.FLAG NO.ERROR < IF          \ if memory error
     DO.ERROR.ALERT THEN          \ run alert
  DISPLAY.WORLD.OUTPUT  THEN  ;      \ display world to output window



: DUP.LINKED.TREE                \ duplicates object and link
   0 TO ERROR.FLAG               \ set error to no.error
 CLEAR.MOVING                 \ clear moving objects
 RESET.UNDO
 CURRENT.OBJECT @ WORLD.OBJECT > IF     \ if greater than world object
   THIS.PAIR LAST.PAIR 8 CMOVE        \ maintain pairs for offset
   CURRENT.OBJECT @ THIS.PAIR 4+ !
   CLONE.TREE                 \ clone object and links
   CURRENT.OBJECT @ 4* DUP.LIST + @
 DUP WORLD.OBJECT > IF
   SET.CURRENT.OBJECT
   RECONCILE.TREE
   ^DELETE.OBJECT UNDO.TOKEN !      \ delete.object is undo
     CURRENT.OBJECT @ DUP UN.OBJECT !  \ set un.object for undo
     THIS.PAIR !              \ and pair for offset
     CURRENT.OBJECT @ WORLD.OBJECT > IF  \ if no memory error
         THE.END  RIGHT.TREE PLACE   \ no siblings at this point
       THE.END  LEFT.TREE PLACE
         THIS.PAIR 4+ @ UP.TREE PLACE  \ use master object for parent
       INSERT.OBJECT          \ insert in links for parent and sibs
     SET.ABSOLUTE           \ all work is in relative space
     DRAW.TREE THEN          \ draw new object
 ELSE DROP THEN
   ERROR.FLAG  NO.ERROR <  IF         \ if memory error
       DO.ERROR.ALERT  THEN        \ run alert
   DISPLAY.WORLD.OUTPUT THEN  ;       \ diplay to output window



( PLACE.NEW.OBJECT )                              ( 110586 YH )

  : PLACE.NEW.OBJECT
  NEW.OBJECT
   CURRENT.OBJECT @ WORLD.OBJECT > IF
   ^DELETE.OBJECT UNDO.TOKEN !
   "UNDO.NEW SET.UNDO$
   CURRENT.OBJECT @ DUP UN.OBJECT !
   MOST.CURRENT !
   DRAW.OBJECT
```

```
    DISPLAY.WORLD.OUTPUT
  ELSE WORLD.OBJECT SET.CURRENT.OBJECT THEN ;

VARIABLE ATTRIBUTE.TOKEN
  VARIABLE ROOT.OBJECT
  VARIABLE TEMP.ATT

 : INHERIT.ATTRIBUTE          \ copies attribute down the tree
 CURRENT.OBJECT @
   ROOT.OBJECT @ = NOT IF
  OBJECT.FORM PLUCK PICT.FORM < IF
      CURRENT.OBJECT @ TEMP.ATT !
      UP.TREE PLUCK SET.CURRENT.OBJECT
      ATTRIBUTE.TOKEN @ EXECUTE
    PLUCKI
      TEMP.ATT @ SET.CURRENT.OBJECT
      ATTRIBUTE.TOKEN @ EXECUTE
      PLACEI
    OBJECT.CHANGED
  THEN
   THEN ;

type.record  ctype.record  - CONSTANT CTYPE.LENGTH

: INHERIT.CONTOUR
CURRENT.OBJECT @
   ROOT.OBJECT @ = NOT IF
  OBJECT.FORM PLUCK PICT.FORM < IF
    CURRENT.OBJECT @ TEMP.ATT !
    UP.TREE PLUCK SET.CURRENT.OBJECT
    OBJECT.FORM PLUCK CASE
      PATH.FORM OF
        GET.CONTOURS
        OBJECT.FORM.RENDER PLUCK
          TEMP.ATT @ SET.CURRENT.OBJECT
        OBJECT.FORM.RENDER PLACE
          PUT.CONTOURS
      ENDOF
      MESH.FORM OF
        GET.MESH
        OBJECT.FORM.RENDER PLUCK
          TEMP.ATT @ SET.CURRENT.OBJECT
        OBJECT.FORM.RENDER PLACE
        PUT.MESH
      ENDOF
    ENDCASE
  OBJECT.CHANGED
   THEN
THEN ;

FIND INHERIT.CONTOUR CONSTANT ^INHERIT.CONTOUR

0 CONSTANT CONTOUR.TYPE
  FIND INHERIT.ATTRIBUTE  CONSTANT ^INHERIT.ATTRIBUTE
  FIND OBJECT.R3POS       CONSTANT ^OBJECT.R3POS
  FIND OBJECT.RSCALE      CONSTANT ^OBJECT.RSCALE
  FIND OBJECT.RCOS        CONSTANT ^OBJECT.RCOS
  FIND OBJECT.TYPE        CONSTANT ^OBJECT.TYPE
FIND OBJECT.RGBCOLOR  CONSTANT ^OBJECT.RGBCOLOR
FIND OBJECT.PALETTE.INDEX CONSTANT ^OBJECT.PALETTE.INDEX
```

```
^OBJECT.R3POS ATTRIBUTE.TOKEN !

: MAKE.TREE.ATTRIBUTE        \ attribute.token -- copies attribute to entire tree
  ATTRIBUTE.TOKEN !          \ set token
  CURRENT.OBJECT @ DUP       \ save current.object
  ROOT.OBJECT !
  OPERATION @             \ save operation
  ^INHERIT.ATTRIBUTE OPERATION !      \ current operation
  TRAVERSE.DOWN.TREE
  OPERATION !
  SET.CURRENT.OBJECT ;

: SET.TREE.CONTOURS          \ attribute.token -- copies attribute to entire tree
  CURRENT.OBJECT @ DUP       \ save current.object
  ROOT.OBJECT !
  OPERATION @             \ save operation
  ^INHERIT.CONTOUR   OPERATION !      \ current operation
  TRAVERSE.DOWN.TREE
  OPERATION !
  SET.CURRENT.OBJECT ;

: PUT.WORLD
  CURRENT.OBJECT @  WORLD.OBJECT SET.CURRENT.OBJECT
  COSINES  OBJECT.ACOS MOVE.RECORD
  COSINES  OBJECT.RCOS MOVE.RECORD
  REDRAW.WORLD SHOW.CURSOR
  SET.CURRENT.OBJECT ;

: SHADE.WORLD
   0 USE.HATCH !
   WORLD.OBJECT SET.CURRENT.OBJECT
 REDRAW.WORLD
  GET.WINDOW >R WORLD.OUTPUT WINDOW
  DISPLAY.WORLD   R> WINDOW ;

: SHOW.HANDLES
  DISPLAY.WORLD.OUTPUT ;

: EDGE.ENHANCE  WATCH SET.CURSOR  ZBUFFER @ THE.BUFFER !
  GET.WINDOW >R WORLD.OUTPUT WINDOW
  PUSH.EDGE DISPLAY.WORLD   R> WINDOW INIT.CURSOR ;

: EDGE.OBJECTS
  WATCH SET.CURSOR
  GET.WINDOW >R WORLD.OUTPUT WINDOW
  (EDGE.OBJECTS)
  DISPLAY.WORLD   R> WINDOW
  INIT.CURSOR
  ZBUFFER @ THE.BUFFER ! ;

                                        ( 110486 YH )

  : MOVE.UP.TREE
    UP.TREE PLUCK >R
  R@ WORLD.OBJECT >
  R> LAST.OBJECT  < AND IF
```

```
  UP.TREE PLUCK SET.CURRENT.OBJECT THEN ;

FIND  MOVE.UP.TREE  UP.KEY.TOKEN !

: MOVE.DOWN.TREE
    DOWN.TREE PLUCK >R
  R@ WORLD.OBJECT >
  R> LAST.OBJECT  < AND IF
  DOWN.TREE PLUCK SET.CURRENT.OBJECT THEN ;

 FIND MOVE.DOWN.TREE DOWN.KEY.TOKEN !

: MOVE.RIGHT.TREE
    RIGHT.TREE PLUCK >R
  R@ WORLD.OBJECT >
  R> LAST.OBJECT  < AND IF
  RIGHT.TREE PLUCK SET.CURRENT.OBJECT THEN ;

 FIND MOVE.RIGHT.TREE RIGHT.KEY.TOKEN !

: MOVE.LEFT.TREE
    LEFT.TREE PLUCK >R
  R@ WORLD.OBJECT >
  R> LAST.OBJECT  < AND IF
  LEFT.TREE PLUCK SET.CURRENT.OBJECT THEN ;

 FIND MOVE.LEFT.TREE LEFT.KEY.TOKEN !


\ DEFINE KEY TOKENS

FIND DELETE.OBJECT BACK.KEY.TOKEN !
```

```
\ constants and utils for Swivel Interface
\ stuff that needs to be used by a number of routines from
\ this point on....

anew Inter.Utils
cr

." Loading Utils and Constants for Interface..."

 -1105 CONSTANT ABORT.ERROR

VARIABLE UNDO.TOKEN

Create InBackground 0 ,
0 constant  ^DoEditorEvents
find drop constant  ^DoXEditor
0 constant  ^InitXEditorMenu
0 constant  ^InitXEditors
Find drop  constant  ^HandleXEditorMenu
Create XEditExits 0 ,


Create Materials.Exist 0 ,


\ memory.errror.handler

  : add.memory.failed
    -108 to error.flag
    do.error.alert
    bye ;

code swap.record
  d0 pop, a0 pop, a1 pop,
  d0 1 long subq, pl if,
    begin,
      a1 () d1 byte move,
      a0 () a1 )+ byte move,
      d1 a0 )+ byte move,
    d0 loop,
  then,
  next end-code


\ menu constants

  6 CONSTANT FILE.MENU
  3 CONSTANT EDIT.MENU
  7 CONSTANT WORLD.MENU
  8 CONSTANT OBJECT.MENU
  9 CONSTANT SHADE.MENU
 10 CONSTANT RENDER.MENU

 \
  GLOBAL FILE.STYLE


\ menu tokens

  0  CONSTANT MENU.ON.TOKEN
  0  CONSTANT NO.ERROR
  0  CONSTANT MENU.OFF.TOKEN

  0  CONSTANT ^PARSE.SCRAP
```

```
 0  CONSTANT ^?CLOSE.LAST.WINDOW
 0  CONSTANT ^SETUP.OBJECT.MENU

\ TWEEN.VARS

CREATE CURRENT.KEY 0 ,
CREATE KEY.COUNT 0 ,
CREATE LOOP.TWEEN? 0 ,


\ EVENT STUFF

: @MOUSE.UP
  MOUSE.UP.RECORD 12 + @
  GLOBAL>LOCAL ;

: @MOUSE.UPXY
  MOUSE.UP.RECORD 12 + @
  GLOBAL>LOCAL
  POINT>XY ;


CREATE SCRAP.FLAG 0 ,
CREATE SCRATCH.TOKEN NULL.TOKEN ,



 CREATE USE.GRID?      0 ,
 CREATE USE.3GRID?       0 ,
 CREATE POLAR?         0 ,
 CREATE PROCEDURAL?      0 ,

HEX
  80000000 CONSTANT TREE.CHANGED
  40000000 CONSTANT JUST.OBJECT.CHANGED
DECIMAL


  : BackIndex2Color
  0 0 LOCALS| THE.MAP THE.CLUT the.rgb THE.INDEX |
  BACK.GDEVICE @ @ +GDPMAP @  TO THE.MAP          \ find the gdevice pixmap
  THE.MAP @ +PMTABLE @ TO THE.CLUT
  THE.CLUT @ +CTTABLE                       \ address of spec array
  THE.INDEX COLORSPEC * +                    \ address of index in array
  +CSRGBCOLOR @RGB
  the.rgb !RGB  ;


  CREATE  HALFTONE.SCREEN 0 ,
  CREATE  HALFTONE.COLOR  0 ,

  : RGB>Reflectance
    @RGB
    LOCALS| H.BLUE H.GREEN H.RED |
    HALFTONE.COLOR @ CASE
      0 OF H.BLUE H.GREEN H.RED      \ if black average colors
      + +  3 / ENDOF
      1 OF H.RED   ENDOF         \ if cyan, use red luminance
      2 OF H.GREEN ENDOF         \ if magenta, use green luminance
      3 OF H.BLUE  ENDOF         \ if yellow use blue luminance
    ENDCASE ;
```

```
: set.reflect
  object.rgbcolor drop
  RGB>Reflectance
  100 color.scale */
  object.direct.scale pluck
  COLOR.SCALE */
  object.reflect place ;

: set.direct
  object.reflect pluck
  color.scale 100  */
  color.scale
  object.rgbcolor drop
  RGB>Reflectance */
  object.direct.scale place ;


  GLOBAL IN.TWEEN?
  0 TO IN.TWEEN?


CODE M+      \ DL DH N
  D2 POP, D1 POP, D0 POP,
  D2 D0 LONG ADD,
  0 D2 MOVEQ,
  D2 D1 LONG ADDX,
  D0 PUSH,
  D1 PUSH,
  NEXT END-CODE


: */ROUND
  0 LOCALS| SIGN DIV MUL N1
  DIV MUL XOR N1 XOR TO SIGN
  N1 ABS MUL ABS M*
  DIV ABS 2/ M+
  DIV ABS M/MOD
  SWAP DROP
  SIGN 0< IF
    NEG
  THEN ;

  : >PERCENTAGE
    abs 100000 scale.range */ROUND  ;        \ converts scale to percentage and back

  : PERCENTAGE>
    abs scale.range 100000 */ROUND  ;        \ converts scale to percentage and back
```

```
\ Swivel>Issac  file records
\ Writes data from swivel objects into a binary file
\ which is more easily read by SGI machines
\ records will be in a binary file with a header

anew --isfiles3--

3 constant IsaacVersion


  STRUCTURE SGIMatRecord
    Long:  +MatType
  4 Longs: +MatDirect
  4 Longs: +MatSpec
  2 Longs: +MatShiny
    Long:  +MatNull
   Structure.End


  STRUCTURE SGILightRecord
    Long:  +SGILightType
  4 Longs: +LightDirect
  5 Longs: +LightVec
    Long:  +LightNull
   Structure.End


SGIMatRecord materials# *   constant matsize
SGILightRecord lights# *  constant lightsize

  STRUCTURE isheader
    Long: +fileversion
    Long: +OffsetToData
      Long: +xmeasure2screen
    Long: +xscreenres
    Long: +ymeasure2screen
    Long: +yscreenres
  40 Bytes: +IsName
  matsize   Bytes: +IsMaterials
  lightsize Bytes: +IsLights
   100 Bytes: +IsUnused
   Structure.End

\ records will be variable length with version and a size first


  STRUCTURE IsObject
    Long: +ObjectVersion
    Long: +ObjectSize   \ length of record
    Long: +ObjectIndex    \ index from swivel
    Long: +ObjectMaterial
    Long: +UpTree
    Long: +DownTree
    Long: +RightTree
    Long: +LeftTree
   6 Longs: +IsaacPointers
   6 Longs: +ObjectRCube
     3 Longs: +RelPos
   3 Longs: +RelAngles
      Long: +RelScale
   6 Longs: +ObjectACube
   3 Longs: +AbsPos
   3 Longs: +AbsAngles
      Long: +AbsScale
```

```
  3 Longs: +MinAngles
 3 Longs: +MaxAngles
 3 Longs: +MinPos
 3 Longs: +MaxPos
 256 bytes: +ObjectAttrbutes  \ attributes from Swivel
10 Longs: +IsaacAttributes
20 Bytes: +ObjectName
  Long: +ObjectFormType
  short: +ObjectRender
  short: +ObjectRenderStyle
 3 Longs: +ObjectColor
    Long: +MeshColumns
  Long: +MeshRows
 0 Bytes: +MeshPoints
Structure.End


: Fix>Float     \ N scale -- float
  float swap
  float swap
  f/ FFP>IEEE ;


: Fix>FloatMove   \ address1 address2 Scale N --
  locals| FScale FN A2 A1 |
  FN 0 do
    A1 @ FScale Fix>Float A2 !
    A1 4+ TO A1
    A2 4+ TO A2
  LOOP ;


: 3Fix>FloatSwap  \ address1 address2 Scale N --
  locals| FScale A2 A1 |
    A1 @ FScale Fix>Float
    A1 4+ @  FScale Fix>Float
    A1 8+ @ FScale Fix>Float
    A2 ! A2 4+ ! A2 8+ !
   ;

: -3Fix>FloatSwap   \ address1 address2 Scale N --
  locals| FScale A2 A1 |
    A1 @  neg   FScale Fix>Float
    A1 4+ @ neg FScale Fix>Float
    A1 8+ @ neg FScale Fix>Float
    A2 8+ ! A2 4+ ! A2 !
   ;


\ The MeshPoints array is a two d array of verticies,
\ these verticies each have 3 3points in them in this order:
\ vertex.position, vertex.normal, and plane.normal
\ the 3points are 3 floats.


\ make materials stuff

 : MakeSGIMat
  Locals| TheMat |
  TheMat SGIMatRecord erase
  CurrentMaterial @ +Material.Type 3 ::
```

```
    CurrentMaterial @ +MaterialType @
    TheMat +MatType !
    CurrentMaterial @ +DirectRGB w@
    CurrentMaterial @ +DirectReflect @ color.scale */
    color.scale Fix>Float
    TheMat +MatDirect 4+ !
    CurrentMaterial @ +DirectRGB 2+ w@
    CurrentMaterial @ +DirectReflect @ color.scale */
    color.scale Fix>Float
    TheMat +MatDirect 8+ !
    CurrentMaterial @ +DirectRGB 4+ w@
    CurrentMaterial @ +DirectReflect @ color.scale */
    color.scale Fix>Float
    TheMat +MatDirect 12 + !

    CurrentMaterial @ +SpecularRGB w@
    CurrentMaterial @ +SpecularReflect @ color.scale */
    color.scale Fix>Float
    TheMat +MatSpec 4+ !
    CurrentMaterial @ +SpecularRGB 2+ w@
    CurrentMaterial @ +SpecularReflect @ color.scale */
    color.scale Fix>Float
    TheMat +MatSpec 8+ !
    CurrentMaterial @ +SpecularRGB 4+ w@
    CurrentMaterial @ +SpecularReflect @ color.scale */
    color.scale Fix>Float
    TheMat +MatSpec 12 + !
    80 1 Fix>Float
    TheMat +MatShiny 4+ !
  then ;


\ make light stuff

  : MakeSGILight
  Locals| TheLight |
    TheLight SGILightRecord erase
    Light.Type @ if

      Light.Type @ TheLight +SGILightType !

      Direct.Scale @ color.scale Fix>Float     \ light is always white for now
      TheLight +LightDirect 4+ !

      Direct.Scale @ color.scale Fix>Float
      TheLight +LightDirect 8+ !

      Direct.Scale @ color.scale Fix>Float
      TheLight +LightDirect 12 + !

      Rel.Light.Vector @
      cos.scaler Fix>Float
      TheLight +LightVec 4+ !
      Rel.Light.Vector 4+ @
      cos.scaler Fix>Float
      TheLight +LightVec 8+ !
      Rel.Light.Vector 8+ @
      cos.scaler Fix>Float
      TheLight +LightVec 12 + !
    then
    ;

 : MAKE.SGI.MESH
```

```
  O.CENTER 12 LPLUCK
  AllPoints 8 +
  256 Locals| C.Scale AllPointer Offz Offy Offx
  OBJECT.SCALE pluck to c.scale
  AllPoints @ AllPoints 4+ @ * 0 do
    AllPointer @ Offz - neg
    c.scale (FIX.SCALE) AllPointer !
    AllPointer 4+ @ Offy - neg
    c.scale (FIX.SCALE) AllPointer 4- !
    AllPointer 8 + @ Offx -
    c.scale (FIX.SCALE) AllPointer 8 - !
    AllPointer 3Point.Length + to AllPointer
  loop ;

: Fetch.Path.Form
  SET.ABSOLUTE                \ set absolute values
  GET.OBJECT                  \ get the object
  THREE.LIST                  \ set all.points list
  MAKE.SGI.MESH
  SET.ACUBE.BOUNDS            \ all.points not translated yet
      CUBE.BOUNDS OBJECT.RCUBE MOVE.RECORD  \ set relative cube
    SET.ALLNORMALS
  ;

: Fetch.Mesh.Form
  SET.ABSOLUTE                \ set absolute values
  GET.OBJECT                  \ get the object
  MAKE.SGI.MESH
  SET.ACUBE.BOUNDS            \ all.points not translated yet
      CUBE.BOUNDS OBJECT.RCUBE MOVE.RECORD  \ set relative cube
  SET.ALLNORMALS
  ;

hex
10000 constant normal.scale
decimal

: NullTerminate
  locals| TheCount TheString
  TheCount 0 do
    TheString I + c@
    32 = if
      0 TheString I + c!
    then
  loop ;

: MoveAllNormalPoints
  locals| the.where |
  OBJECT.FORM PLUCK               \ get the form of the object
  MESH.FORM =
  OBJECT.FORM PLUCK               \ get the form of the object
  PATH.FORM = OR IF
  AllPoints @ AllPoints 4+ @ * 0 do
    AllPoints 8 + I 3point.length * +      \ current allpoint
    the.where I 3point.length * 3 * +      \ pointer to position of vertex
      1024 3Fix>FloatSwap                  \ move 3 in
    NormalPoints 8 + I 3point.length * +   \ current normalpoint
    the.where I 3point.length * 3 * +      \ pointer to plane normal
    3point.length 2* +              \ two 3points per record
    normal.scale -3Fix>FloatSwap       \ move 3 more in
  LOOP
  Make.Average.Normals
  AllPoints @ AllPoints 4+ @ * 0 do
```

```
  NormalPoints 8 + I 3point.length * -   \ current normalpoint
  the.where I 3point.length * 3 * +      \ pointer to plane normal
  3point.length +               \ two 3points per record
  normal.scale -3Fix>FloatSwap       \ move 3 more in
LOOP
THEN ;

: (Swiv>IsaacRecord)
 SC @ locals| c.scale IsHandle |
 current.object @ >R               \ set the current scale
 up.tree pluck set.current.object
 Object.scale pluck SC !
 R> set.current.object
 IsaacVersion IsHandle @ +ObjectVersion !
 IsHandle handle.size IsHandle @ +ObjectSize !    \ length of record
 Current.Object @ IsHandle @ +ObjectIndex !     \ index from swivel
 object.material.index pluck IsHandle @ +ObjectMaterial !
 Up.Tree Pluck IsHandle @ +UpTree !
 Down.Tree Pluck IsHandle @ +DownTree !
 Right.Tree Pluck IsHandle @ +RightTree !
 Left.Tree Pluck IsHandle @ +LeftTree !
 Object.Rcube drop IsHandle @ +ObjectRCube
 6 1024 Fix>FloatMove
   Object.R3Pos Pluck
 SCALER                   \ normalize the scale
   neg 1024 Fix>Float IsHandle @ +RelPos 8+ !
 neg 1024 Fix>Float IsHandle @ +RelPos 4+ !
   1024 Fix>Float IsHandle @ +RelPos !
 Object.Rcos pluck 3angle
 10 Fix>Float IsHandle @ +RelAngles 8+ !
 10 Fix>Float IsHandle @ +RelAngles 4+ !
 neg 10 Fix>Float IsHandle @ +RelAngles !
 scale.range scale.range Fix>Float          \ relative scale is ...
 IsHandle @  +RelScale !
   Object.A3Pos Pluck
 SCALER                   \ normalize the scale
   neg 1024 Fix>Float IsHandle @ +AbsPos 8+ !
 neg 1024 Fix>Float IsHandle @ +AbsPos 4+ !
   1024 Fix>Float IsHandle @ +AbsPos !
 Object.Acos pluck 3angle
 10 Fix>Float IsHandle @ +AbsAngles 8+ !
 10 Fix>Float IsHandle @ +AbsAngles 4+ !
 neg 10 Fix>Float IsHandle @ +AbsAngles !
 scale.range scale.range Fix>Float                \ absolute scale is ...
 IsHandle @  +AbsScale !
   \ +MinAngles
 \ +MaxAngles
 \ +MinPos
 \ +MaxPos
   OBJECT.TEXT.FIELD0 drop
 IsHandle @ +ObjectAttrbutes  256 cmove      \ attributes from Swivel
 Object.String drop
 IsHandle @ +ObjectName 20 cmove
 IsHandle @ +ObjectName 20 NullTerminate
 Object.Form Pluck IsHandle @ +ObjectFormType !
 OBJECT.FORM.RENDER Pluck IsHandle @ +ObjectRender W!
 OBJECT.RENDER Pluck IsHandle @ +ObjectRenderStyle W!
 Object.RGBColor drop @RGB
 object.direct.scale pluck COLOR.SCALE  */
 Color.Scale Fix>Float IsHandle @ +ObjectColor 8 + !
 object.direct.scale pluck COLOR.SCALE  */
 Color.Scale Fix>Float IsHandle @ +ObjectColor 4 + !
 object.direct.scale pluck COLOR.SCALE  */
```

```
Color.Scale Fix>Float IsHandle @ +ObjectColor !
  AllPoints @ IsHandle @ +MeshColumns !
AllPoints 4+ @ IsHandle @ +MeshRows !
IsHandle @ +MeshPoints MoveAllNormalPoints
c.scale SC !                    \ restore SC
;

: WriteIsMats                   \ write the materials to header
  locals| theMats |
  materials# 0 do
    I setcurrentmaterial
    I SGIMatRecord * theMats + MakeSGIMat
  Loop ;

: WriteIsLights                  \ write the lights to header
  locals| theLights |
  lights# 0 do
    I SetCurrentLight
    I SGILightRecord * theLights + MakeSGILight
  Loop ;

: MakeISHeader
  0 locals| HdHandle |
  IsHeader From.heap to HdHandle
  HdHandle if
    HdHandle @ isheader erase
    IsaacVersion HdHandle @ +fileversion !
    isheader HdHandle @ +OffsetToData !
     1 float HdHandle @ +xmeasure2screen !
    72 float HdHandle @  +xscreenres !
    1 float HdHandle @ +ymeasure2screen !
    72 float HdHandle @  +yscreenres !
    Output.Title 1+
    HdHandle @ +IsName
    Output.Title c@ 39 min cmove
    0 HdHandle @ +IsName Output.Title c@ 40 min - c!
    HdHandle @ +IsMaterials WriteIsMats
    HdHandle @ +IsLights    WriteIsLights
    HdHandle @  HdHandle handle.size IS.POINTER IS.FILE WRITE.VIRTUAL
    HdHandle handle.size IS.POINTER + TO IS.POINTER
    IO-RESULT @ TO ERROR.FLAG
    HdHandle to.heap
  else
    -108 to error.flag
  then
   ;

: Swiv>IsaacRecord
  0 LOCALS| IsHandle |
     OBJECT.STATE PLUCK UNUSED > IF          \ if its in use...
    0 Allpoints !
    0 AllPoints 4+ !
    OBJECT.FORM PLUCK               \ get the form of the object
    case
      MESH.FORM OF
        Fetch.Mesh.Form ENDOF          \ mesh form drawing
      PATH.FORM OF
        Fetch.Path.Form ENDOF
    ENDCASE
    IsObject
```

```
  AllPoints @
  AllPoints 4+ @ *
  3Point.Length * 3 * +            \ 3 3points in the vertex record
  From.Heap to IsHandle
  IsHandle 0> if
    IsHandle (Swiv>IsaacRecord)
  else
    -108 to error.flag
  then
then
ISHANDLE ;


: write.Isaac.object
  0 locals| the.Handle |
  SET.WATCH.CURSOR
  ERROR.FLAG 0= IF
    Swiv>IsaacRecord to the.Handle
    The.Handle @  The.Handle handle.size IS.POINTER IS.FILE WRITE.VIRTUAL
    The.Handle handle.size IS.POINTER + TO IS.POINTER
    IO-RESULT @ TO ERROR.FLAG
    the.Handle to.heap
  then ;
```

```
ANEW --RENDERFLAGS--

609 MakeSwapOver DO.ISAAC.FLAG.PANEL

StartSwapOver

\ flags for object.form.render

  2 BASE !
  10000        CONSTANT OBJECT.INVISIBLE
  100000         CONSTANT OBJECT.TREE.INVISIBLE
  1000000        CONSTANT OBJECT.VIS.BOUNDING
  10000000       CONSTANT UNUSED.BIT8
  100000000      CONSTANT UNUSED.BIT9
  1000000000       CONSTANT UNUSED.BIT10
  10000000000      CONSTANT UNUSED.BIT11
  100000000000     CONSTANT NO.NORMAL.AVERAGE
  1000000000000      CONSTANT RENDER.WIREFRAME
  10000000000000     CONSTANT RENDER.HIDEFRAME
  100000000000000    CONSTANT RENDER.SHADEFRAME
  1000000000000000   CONSTANT RENDER.SHADED

  DECIMAL


 17000 NEW.DIALOG.RECORD

  1 MAKE.ACTIVE.ITEM  ISAAC.FLAG.OK
  2 MAKE.ACTIVE.ITEM  ISAAC.FLAG.CANCEL
  3 MAKE.CHECK.ITEM   ISAAC.INVISIBLE
  4 MAKE.CHECK.ITEM   ISAAC.TREE.INVISIBLE
  5 MAKE.CHECK.ITEM   ISAAC.VIS.BOUNDING
  6 MAKE.CHECK.ITEM   ISAAC.BIT8
  7 MAKE.CHECK.ITEM   ISAAC.BIT9
  8 MAKE.CHECK.ITEM   ISAAC.BIT10
    9 MAKE.CHECK.ITEM   ISAAC.BIT11
   10 MAKE.CHECK.ITEM   ISAAC.NO.NORMAL.AVERAGE

 NAME.DIALOG.RECORD Isaac.Flag.Panel


: RENDER.TEST.AND.SET
  OBJECT.FORM.RENDER PLUCK
  LOCALS| THE.SOURCE THE.DEST THE.BIT
  THE.BIT THE.SOURCE AND IF
    1 THE.DEST !
  ELSE
    0 THE.DEST !
  THEN ;

: RENDER.TEST.AND.PUT
  LOCALS|  THE.DEST THE.BIT
  THE.DEST @ IF
    OBJECT.FORM.RENDER PLUCK
    THE.BIT OR
    OBJECT.FORM.RENDER PLACE
  ELSE
    OBJECT.FORM.RENDER PLUCK
    -1 THE.BIT XOR AND
    OBJECT.FORM.RENDER PLACE
  THEN ;
```

```
: GET.ISAAC.FLAGS
  OBJECT.INVISIBLE ISAAC.INVISIBLE RENDER.TEST.AND.SET
  OBJECT.TREE.INVISIBLE ISAAC.TREE.INVISIBLE RENDER.TEST.AND.SET
  OBJECT.VIS.BOUNDING ISAAC.VIS.BOUNDING RENDER.TEST.AND.SET
  UNUSED.BIT8 ISAAC.BIT8 RENDER.TEST.AND.SET
  UNUSED.BIT9 ISAAC.BIT9 RENDER.TEST.AND.SET
  UNUSED.BIT10 ISAAC.BIT10 RENDER.TEST.AND.SET
  UNUSED.BIT11 ISAAC.BIT11 RENDER.TEST.AND.SET
  NO.NORMAL.AVERAGE ISAAC.NO.NORMAL.AVERAGE RENDER.TEST.AND.SET
  ;

: PUT.ISAAC.FLAGS
  OBJECT.INVISIBLE ISAAC.INVISIBLE RENDER.TEST.AND.PUT
  OBJECT.TREE.INVISIBLE ISAAC.TREE.INVISIBLE RENDER.TEST.AND.PUT
  OBJECT.VIS.BOUNDING ISAAC.VIS.BOUNDING RENDER.TEST.AND.PUT
  UNUSED.BIT8 ISAAC.BIT8 RENDER.TEST.AND.PUT
  UNUSED.BIT9 ISAAC.BIT9 RENDER.TEST.AND.PUT
  UNUSED.BIT10 ISAAC.BIT10 RENDER.TEST.AND.PUT
  UNUSED.BIT11 ISAAC.BIT11 RENDER.TEST.AND.PUT
  NO.NORMAL.AVERAGE ISAAC.NO.NORMAL.AVERAGE RENDER.TEST.AND.PUT
  ;

 : I.BYE
   LOCALS| C.ITEM HIT.ITEM C.RECORD
     DROP 1   ;

      FIND I.BYE ISAAC.FLAG.CANCEL !

 : I.SAVE
   LOCALS| C.ITEM HIT.ITEM C.RECORD
     PUT.ISAAC.FLAGS ;

   FIND I.SAVE ISAAC.FLAG.OK !

 : (DO.ISAAC.FLAG.PANEL)
   GET.ISAAC.FLAGS
       ISAAC.FLAG.PANEL
   HANDLE.DIALOG ;

SetSwapOverToken
EndSwapOver
```

```
\ KEY HANDLING ROUTINES

CR ." Loading Key Handling routines..."

 : (KEY.NULL) ;
 FIND  (KEY.NULL) CONSTANT KEY.NULL

       CREATE   BACK.KEY.TOKEN KEY.NULL ,
       CREATE   LEFT.KEY.TOKEN KEY.NULL ,
       CREATE  RIGHT.KEY.TOKEN KEY.NULL ,
   CREATE   DOWN.KEY.TOKEN KEY.NULL ,
     CREATE     UP.KEY.TOKEN KEY.NULL ,
       CREATE      Y.KEY.TOKEN KEY.NULL ,
   CREATE      P.KEY.TOKEN KEY.NULL ,
       CREATE      R.KEY.TOKEN KEY.NULL ,
       CREATE      X.KEY.TOKEN KEY.NULL ,
       CREATE      C.KEY.TOKEN KEY.NULL ,
       CREATE      Z.KEY.TOKEN KEY.NULL ,
       CREATE      S.KEY.TOKEN KEY.NULL ,


 : HANDLE.KEYS
    ?KEYSTROKE IF
      CASE
           8 OF   BACK.KEY.TOKEN @ EXECUTE ENDOF
      28 OF   RIGHT.KEY.TOKEN @ EXECUTE ENDOF
            29 OF   LEFT.KEY.TOKEN @ EXECUTE ENDOF
        30 OF     UP.KEY.TOKEN @ EXECUTE ENDOF
      31 OF   DOWN.KEY.TOKEN @ EXECUTE ENDOF
   ASCII Y OF      Y.KEY.TOKEN @ EXECUTE ENDOF
   ASCII P OF      P.KEY.TOKEN @ EXECUTE ENDOF
       ASCII R OF      R.KEY.TOKEN @ EXECUTE ENDOF
       ASCII X OF      X.KEY.TOKEN @ EXECUTE ENDOF
       ASCII C OF      C.KEY.TOKEN @ EXECUTE ENDOF
       ASCII Z OF      Z.KEY.TOKEN @ EXECUTE ENDOF
       ASCII S OF      S.KEY.TOKEN @ EXECUTE ENDOF
      ENDCASE  THEN ;
```

```
\ lighting dialog

ANEW --light.panel--

cr ." Loading Lighting.Panel..."

   New.Window LIGHT.WINDOW

  8102 NEW.DIALOG.RECORD

  1 MAKE.ACTIVE.ITEM  Light.Bright
  2 MAKE.ACTIVE.ITEM  Light.View
  3 MAKE.RADIO.ITEM   Light1
  4 MAKE.RADIO.ITEM   Light2
  5 MAKE.RADIO.ITEM   Light3
  6 MAKE.RADIO.ITEM   Light4
  7 MAKE.RADIO.ITEM   Light5
  8 MAKE.RADIO.ITEM   Light6
  9 MAKE.RADIO.ITEM   Light7
   10 MAKE.RADIO.ITEM   Light8
   11 Make.check.item   LightOn
   12 Make.check.item   LightFill
   13 Make.check.item . LightAuto
   14 make.active.item  LightDraw
   15 Make.check.item   LightWorldLock

 NAME.DIALOG.RECORD LIGHT.PANEL

1 LightAuto !

0 constant ^undo.light
create ^redraw 0 ,

: light.edit.menu
   EDIT.MENU MENU.SELECTION:
   CASE
        1 OF  Undo.token @ execute  ENDOF
   ENDCASE 0 HILITE.MENU  ;

: check.in.lights
  LightHand @ @ lights Light.Record lights# * cmove
  light.edit.menu ;


: check.out.lights
  LightHand @ @ lights Light.Record lights# * compare.record
  if
    SET.RELATIVE.LIGHTS
    lights LightHand @ @ Light.Record lights# * cmove
    SetMaterialsChanged
    WORLD.OBJECT TREE.CHANGED + CHANGED.FLAG !
  then
  DA.EDIT.MENU ;        \ disable the undo item


: mark.light.change
    lights  TempLights Light.Record lights# * cmove
    ^undo.light  undo.token !
    1
    23 202 ResString        \ " Undo Lighting Change"
    3 SET.ITEMS  ;
```

```
: get.light#
 0 Light1 !
 0 Light2 !
 0 Light3 !
 0 Light4 !
 0 Light5 !
 0 Light6 !
 0 Light7 !
   0 Light8 !
 current.light @ light.record / case
   0 of 1 Light1 ! endof
   1 of 1 Light2 ! endof
   2 of 1 Light3 ! endof
   3 of 1 Light4 ! endof
   4 of 1 Light5 ! endof
   5 of 1 Light6 ! endof
   6 of 1 Light7 ! endof
   7 of 1 Light8 ! endof
 endcase
 light.type @ 1 and if
   1 lighton !
 else
   0 lighton !
 then
 light.type @ 2 and if
   1 LightFill !
 else
   0 lightFill !
 then   ;


: put.light#
 LightOn @ if
   Light.type @ 1 or Light.type !
 else
   Light.type @ 2 and Light.type !
 then

 LightFill @ if
   Light.type @ 2 or Light.type !
 else
   Light.type @ 1 and Light.type !
 then
 Light1 @ if 0 setcurrentlight then
 Light2 @ if 1 setcurrentlight then
 Light3 @ if 2 setcurrentlight then
 Light4 @ if 3 setcurrentlight then
 Light5 @ if 4 setcurrentlight then
 Light6 @ if 5 setcurrentlight then
 Light7 @ if 6 setcurrentlight then
 Light8 @ if 7 setcurrentlight then
 ;


: Show.Sphere                  \ draws sphere.map on light.pane.
 get.window
   locals| the.wind |
   light.window ?active.wptr if
   light.window window
   0 setcurrentmaterial
     ' light.view item.rect + @rect
     temp.rect !rect
```

```
    black penpat
    envir.cport 2+ @ @
  light.window 2+
      envir.cport 2+ @ @ 6 -
  temp.rect
    0 0 copy.bits
  then
the.wind ?active.wptr if
  the.wind (window)
then ;


: (UPDATE.LIGHT.MAPS)
  current.light @
  locals| the.light |
  CurrentMaterial @ +MaterialType @ if
    ^envir.bits @ @ 256 dup *
    KEY.COLOR.RES @ 1 - fill        \ fill the map with the base color
    lights# 0 do
      I SetCurrentLight
      Light.Type @ 1 and if
        calc.material.direct
        Show.Sphere
        Light.Type @ 2 and not if
          calc.material.specular
        then
      then
    loop
    average.sphere
    Show.Sphere
    the.light current.light !
    False CurrentMaterial @ +MaterialChanged !
  then ;


: UPDATE.LIGHT.MAPS
  LightAuto @
  Light.type @ 1 and and if
    (UPDATE.LIGHT.MAPS)
  else
    Show.Sphere
  then
  flush.events ;


: UpdateBrightness
  direct.scale
  ' Light.Bright item.rect -
  UpdateScaleControl ;


: Do.Bright.View
  0 LOCALS| THE.RECT C.ITEM HIT.ITEM C.RECORD
  Mark.light.change
  direct.scale
  ' Light.Bright item.rect +
  handle.scale.control if
    UPDATE.LIGHT.MAPS
    8 penmode
    ROTATE.SPOT
  then ;
```

```
find Do.Bright.View Light.Bright !

: do.lighton
  LOCALS| C.ITEM HIT.ITEM C.RECORD
  mark.light.change
  C.RECORD HIT.ITEM C.ITEM
  ^HANDLE.CHECK execute
  C.ITEM ITEM.BOOL + @
  if
    light.type @ 1 or light.type !
  else
    light.type @ 2 and light.type !
  then  ;

find do.lighton ' lighton ITEM.HANDLER.TOKEN + !

: DoFillOn
  LOCALS| C.ITEM HIT.ITEM C.RECORD
  mark.light.change
  C.RECORD HIT.ITEM C.ITEM
  ^HANDLE.CHECK execute
  C.ITEM ITEM.BOOL + @
  if
    light.type @ 2 or light.type !
  else
    light.type @ 1 and light.type !
  then  ;

find DoFillOn ' LightFill ITEM.HANDLER.TOKEN + !


: doLightWorldLock
  LOCALS| C.ITEM HIT.ITEM C.RECORD
  C.RECORD HIT.ITEM C.ITEM
  ^HANDLE.CHECK execute
  C.ITEM ITEM.BOOL + @
  light.lock !  ;

find doLightWorldLock  ' lightworldlock ITEM.HANDLER.TOKEN + !


: doLightDraw
  LOCALS| C.ITEM HIT.ITEM C.RECORD
  (update.light.maps)
  10 penmode
  rotate.spot ;


find doLightDraw LightDraw !


: DO.LIGHT.CHANGE
  LAST.RADIO.ITEM @ 3 - LIGHT.RECORD *
  CURRENT.LIGHT @ = NOT IF
     UpdateBrightness
     LIGHT.PANEL GET.ITEM.DATA          \ If deactivated fetch changes
     PUT.LIGHT#
     GET.LIGHT#
     LIGHT.PANEL SET.ITEMS          \ set booleans, text
     show.sphere
     8 penmode
     ROTATE.SPOT
     UpdateBrightness
```

```
  THEN ;


: DO.Light.View
  0 LOCALS| THE.RECT C.ITEM HIT.ITEM C.RECORD |
  10 penmode
  Mark.light.change
  HANDLE.LIGHT.CURSOR
  UPDATE.LIGHT.MAPS
  8 penmode
  ROTATE.SPOT
  ;


find DO.Light.View Light.View !


: UPDATE.LIGHT.WINDOW
  CurrentMaterialIndex @
  get.window
    locals| the.wind the.mat
    light.window ?active.wptr if
    0 setcurrentmaterial
    light.window window
    LIGHT.WINDOW DRAW.DIALOG
    Show.Sphere
    8 penmode
    ROTATE.SPOT
    ' Light.Bright item.rect +
    @rect swap 2swap swap 2swap
    white pattern rectangle
    UpdateBrightness
    then
  the.wind ?active.wptr if
    the.wind (window)
  then
  the.mat setcurrentmaterial ;

: UpdateMaterials
  (UpdateMaterials)
  UPDATE.LIGHT.WINDOW ;


: undo.light.change
  templights lights Light.Record lights# *
  swap.record
  front.window light.window = if
    (UPDATE.LIGHT.MAPS)
    UPDATE.LIGHT.WINDOW
  then
  get.light#
  light.window ?active.wptr if
    LIGHT.PANEL SET.ITEMS          \ set booleans, text
  then
    front.window  world.output = if
    SET.RELATIVE.LIGHTS
    world.object set.current.object
    ^redraw @ execute
    display.world
  then   ;


find undo.light.change ' ^undo.light !
```

```
: DO.LIGHT.PANEL
    LIGHT.PANEL
  LOCALS|  C.DIALOG |
  IF LIGHT.WINDOW DPUSH          \ push current dialog on d stack
    CURRENT.LIGHT @
    LIGHT.RECORD / 3+
    LAST.RADIO.ITEM !
    check.in.lights
    0 setcurrentmaterial       \ always use white sphere
    TestPrimeMaterial
    8 PENMODE
    get.light#
    C.DIALOG GET.ITEMS         \ fetch item handles, rects
      C.DIALOG SET.ITEMS         \ set booleans, text
    WINDOW.REGION.EMPTY
    UPDATE.LIGHT.WINDOW
     BEGIN              \ start of event handling
    DO.EVENTS
    IN.CLOSE.BOX = IF    \ check for close
      check.out.lights
      LIGHT.WINDOW CLOSE.DIALOG
      DPOP DROP
    THEN
    ?KEYSTROKE IF DROP THEN       \ handle keystrokes
    DIALOG.EVENT?            \ check for dialog events
      IF SWAP DGET = IF        \ if dialog event check for current
        C.DIALOG HANDLE.ITEMS     \ if current handle items
        DO.LIGHT.CHANGE
      THEN
      ELSE 2DROP THEN        \ else drop dialog event args
    AGAIN               \ endless loop until deactivated
   ELSE
    C.DIALOG GET.ITEM.DATA       \ if deactivated fetch changes
    DPOP DROP              \ pop dialog from stack
    check.out.lights
  THEN  ;


 : UP.RIGHT.on.screen  ( t\l\b\r -- t'\l'\b'\r' )
    screen.bounds @rect
  locals| sx2 sy2 sx1 sy1 wx2 wy2 wx1 wy1
  wy2 wy1 - 50 + to wy2
  wX1 wX2 - to wX1
  50 to wy1
  0 to wx2
  sx2 10 - wx2 + to wx2
  sx2 10 - wx1 + to wx1
  wy1 wx1 wy2 wx2 ;


 : INIT.LIGHT.PANEL
    0 LOCALS| D.HAND |
    ASCII DLOG 8102 GET.RESOURCE TO D.HAND
    D.HAND 0 = NOT IF
     D.HAND @ @RECT
     UP.RIGHT.on.screen
     D.HAND @ !RECT
    THEN
    LIGHT.WINDOW On.Activate  DO.LIGHT.PANEL
    LIGHT.WINDOW On.Update UPDATE.LIGHT.WINDOW
     ;
```

```
: RESET.LIGHT
  INIT.LIGHT.PANEL
  ASCII DLOG 8102 GET.RESOURCE IF
  8102 LIGHT.WINDOW ADD.DIALOG
  then ;
```

```
ANEW N.LINKER

CR ." Loading Link Drawing ..."

\ Drawing routines for tree elements
\ 2.9.87 by Young Harvill
\ two different link cursor modes are used
\ depending on variable link.time
\ first is a line representing the axis of the greatest dimension
\ of the cube enclosing the object
\ and second is the cube enclosing the object


: GET.SOME                 \ just fetch necessary object vars
  OBJECT.A3POS PLUCK          \ to globals ,
  DISTANCE ! OBJECTY ! OBJECTX !     \ no cursor vars as they hold
  OBJECT.ACOS COSINES SWAP MOVE.RECORD
  OBJECT.R3CENTER O.CENTER SWAP MOVE.RECORD
  OBJECT.SCALE PLUCK SC ! ;


  CODE (GREAT.AXIS)            \ LZ GZ LY GY LX GX  --  greatest axis xyz xyz
      5 SP@, D0 LONG MOVE,        \ find z axis difference
      6 SP@, D0 LONG SUB,
      3 SP@, D1 LONG MOVE,          \ find y axis difference
      4 SP@, D1 LONG SUB,
    SP ()  D2 LONG MOVE,        \ find y axis difference
      2 SP@, D2 LONG SUB,
      D1 D0 LONG CMP, GE IF,        \ if z is bigger than y....
    D2 D0 LONG CMP, GE IF,      \ if z is bigger than x....
     D3 POP,            \ z as major axis
     SP )+ D3 LONG ADD,
     D3 1 # LONG ASR,
     D2 POP,            \ z as major axis
     SP )+ D2 LONG ADD,
     D2 1 # LONG ASR,
     D1 POP,
     D0 POP,
     D3 PUSH,           \ push average x
     D2 PUSH,           \ push average y
     D0 PUSH,           \ push first z
     D3 PUSH,           \ push average x
     D2 PUSH,           \ push average y
     D1 PUSH,           \ push second z
    ELSE,
     D3 POP,            \ x as major axis
     D2 POP,
     D1 POP,            \ x as major axis
     SP )+ D1 LONG ADD,
     D1 1 # LONG ASR,
     D0 POP,
     SP )+ D0 LONG ADD,
     D0 1 # LONG ASR,
     D3 PUSH,           \ push first x
     D1 PUSH,           \ push average y
     D0 PUSH,           \ push average z
     D2 PUSH,           \ push second x
     D1 PUSH,           \ push average y
     D0 PUSH,           \ push average z
    THEN,
    ELSE,
    D2 D1 LONG CMP, GE IF,        \ if y is bigger than x....
      D3 POP,           \ average x
```

```
      SP )+ D3 LONG ADD,
      D3 1 # LONG ASR,
      D2 POP,            \ y as major axis
      D1 POP,
      d0 POP,
      SP )+ D0 LONG ADD,       \ average z
      D0 1 # LONG ASR,
      D3 PUSH,           \ push average x
      d2 PUSH,           \ push first y
      d0 PUSH,           \ push average z
      D3 PUSH,           \ push average x
      d1 PUSH,           \ push first y
      d0 PUSH,           \ push average z
    ELSE,
      D3 POP,            \ x as major axis
      D2 POP,
      D1 POP,            \ x as major axis
      SP )+ D1 LONG ADD,
      D1 1 # LONG ASR,
      D0 POP,
      SP )+ D0 LONG ADD,
      D0 1 # LONG ASR,
      D3 PUSH,           \ push first x
      D1 PUSH,           \ push average y
      D0 PUSH,           \ push average z
      D2 PUSH,           \ push first x
      D1 PUSH,           \ push average y
      D0 PUSH,           \ push average z
    THEN,
   THEN,
NEXT END-CODE

  : GREAT.AXIS                \ draws greater axis to redraw
        cube.bounds 24  LPLUCK     \ use current relative cube.bounds
        (GREAT.AXIS) >R >R >R      \ save top vector
        TOTAL.TRANS
     FIX>INTEGER DROP          \ translate vector
        YOFFSET @ + SWAP           \ offset for mid screen
        XOFFSET @ + SWAP R> R> R>    \ now for next vector
        TOTAL.TRANS
     FIX>INTEGER DROP          \ translate
        YOFFSET @ + SWAP           \ offset
        XOFFSET @ + SWAP
        PUT.REDRAW ;               \ write to redraw buffer


  : Ndraw.1.FRAME
     TRANS.POINT
       poly.points          to.stack DROP
       poly.points 12 +     to.stack DROP   PUT.REDRAW
       poly.points 12 +     to.stack DROP
       poly.points 24 +     to.stack DROP   PUT.REDRAW
       poly.points 24 +     to.stack DROP
       poly.points 36 +     to.stack DROP   PUT.REDRAW
       poly.points 36 +     to.stack DROP
       poly.points          to.stack DROP   PUT.REDRAW   ;


  : FULL.CUBE
    4 #POLY.POINTS !
      1stface TO.SHADE/POLY.POINTS  DRAW.1.FRAME
```

```
    4thface TO.SHADE/POLY.POINTS  DRAW.1.FRAME
    2NDface TO.SHADE/POLY.POINTS  DRAW.1.FRAME
    5THface TO.SHADE/POLY.POINTS  DRAW.1.FRAME
    3RDface TO.SHADE/POLY.POINTS  DRAW.1.FRAME
    6THface TO.SHADE/POLY.POINTS  DRAW.1.FRAME  ;

 CREATE LINK.TIME 2 ,


:  MULTI-CUBE
   LINK.TIME @ 1 =
   UP.TREE PLUCK  WORLD.OBJECT = NOT AND IF
       GREAT.AXIS
   ELSE
       FULL.CUBE
   THEN  ;


VARIABLE ROOT.CUBE

: DRAW.ONE.CUBE          \ draw one cursor element for current object
  CURRENT.OBJECT @
  ROOT.CUBE @ = NOT IF        \ root is already drawn
   OBJECT.RCUBE          \ cube.bounds are used to draw element
   CUBE.BOUNDS
   SWAP MOVE.RECORD
   SET.ABSOLUTE          \ set absolute for current object
   GET.SOME            \ get minimal vars
   MULTI-CUBE            \ draw element that is appropriate for time
  THEN ;


 FIND DRAW.ONE.CUBE
 CONSTANT ^DRAW.ONE.CUBE


: UPDATE.LINK              \ update cursor for entire tree
  CURRENT.OBJECT @ ROOT.CUBE !      \ set root.cube so that it is not redrawn
  OPERATION @              \ save operation on stack
  ^DRAW.ONE.CUBE OPERATION !     \ set draw cube as current operation
  TRAVERSE.DOWN.TREE         \ do operation down the tree
  OPERATION !              \ restore operation
  OBJECT.RCUBE
  CUBE.BOUNDS
  SWAP MOVE.RECORD           \ retore cube.bounds for root
  GET.SOME ;              \ restore minimal vars for root
```

```
\ Motorola Fast Floating Point for Macintosh

\ © Copyright 1986, by Creative Solutions, Inc.
\ All Rights Reserved.

\ Permission is hereby granted to registered MacForth customers to use
\ this source code in their own applications, provided that the author
\ acknowledges Creative Solutions' contribution within the application's
\ documentation, and /or  "credit screen".  Distribution of this source
\ code to any third party or other use is prohibited.
\

\ Original VME10 version by Don Colburn, 1982
\   version for the Amiga by D.A.T.
\   Modified for the Atari ST by Greg Guerin  23Aug86
\   Includes Motorola 68343 Fast Floating Point

\   Copyright (c) 1981 by Motorola & Creative Solutions, Inc.


anew FFP-Marker

decimal
  5500 minimum.object
   800 minimum.vocab

\ Define structure-member defining-words
: Float:  long:  ;
: Floats:  longs:  ;

: <, ( -- )    \ Append numbers to file up to next  " ,> "
  begin bl scan  " ,>"  =pocket or not
  while Pocket  bl over count + c! number ,
  Repeat ;


create FFPBinary    \ start of binary code module

hex
 <, 000002B0   4EEE0000   60000088   60000072   6000009C
  600000AE   600000B8   600000C2   600000CC   600000D6
  600000E8   600000DA   600000EE   600000FA   60000100
  60000142   60000102   60000108   6000014C   6000010A
  60000110   60000116   6000011C   60000162   6000014A
  6000016E   6000017E   60000194   600001BA   600001C6
  600001D6   6000021A   C146C347   4CDF00C0   610010AA
  C146C347   6004201F   4A005BC0   6F0A2F3C   00000001
  6000FF62   488048C0   2F006000   FFB848E3   0F004CDF
  00C06100   0E022F07   4CDB00F0   6000FF42   48E30F00
  4CDF00C0   61000DDA   60E848E3   0F004CDF   00C06100
  0EB060DA   48E30F00   4CDF00C0   61000F1C   60CC48E3
  0F004CDF   00C06100   0FBA60BE   48E30F00   2E1F6100
  0BC860B2   022F007F   00036000   FEF44A97   67060A2F
  00800003   6000FEE6   C3472E1F   610005F6   2F07C347
  6000FED6   C3472E1F   610005D4   60EEC347   2E1F6100
  05C460E4   C3472E1F   61000818   60DAC347   2E1F6100
  073E60D0   C3472E1F   6100044E   60C6C347   2E1F6100
  04FC60BC   C3472E1F   610004C4   60B2C347   2E1F6100
  051A60A8   C146C347   2E1F6100   05762F06   2F07C146
  C3476000   FE70C146   C3474CDF   00C06100   053A2F07
  C146C347   6000FE5A   C145C347   2E1F6100   0C6A2F07
  C145C347   6000FE46   C145C347   2E1F6100   0CA82F07
  C145C347   6000FE32   205FCF41   2E1F6100   0324CF41
  20DF20DF   6000FE1E   205FCF41   2E1F6100   00C020DF
```

| | | | | |
|---|---|---|---|---|
| 20DF20DF | 30DF2F07 | CF416000 | FE04205F | CF41CD40 |
| 2C1F2E1F | D0FC000E | 3F202F20 | 2F202F20 | 61000B64 |
| 20DF20DF | 20DF30DF | CF41CD40 | 6000FDDA | CF412E1F |
| 61000824 | 2F07CF41 | 6000FDCA | CB40CF41 | 2E1F6100 |
| 08262F07 | CB40CF41 | 6000FDB6 | CF412E1F | 610002AA |
| CF41201F | 74007607 | 2202D482 | D482D481 | D4827200 |
| D080D301 | D080D301 | D080D301 | D080D301 | D48151CB |
| FFE04A5F | 6A044482 | 4E71321F | 488148C1 | 2F022F01 |
| 6000FD6E | 205748E3 | CF006100 | 00D691DF | 2F072F08 |
| 4CDB00F0 | 6000FD56 | 4FEFFFF6 | 2F2F000A | 4A0740E7 |
| 48E73EC0 | 66027E41 | 3F7C2B2E | 00221C07 | 6A04542F |
| 0022DC06 | 1E3C0080 | BF064886 | E2467601 | 41FA0864 |
| BC506D1C | 6E0CBEA8 | 00026420 | 5C485343 | 601A41E8 |
| FFFA5243 | BC506EF6 | 67E860EC | 41E80006 | 5343BC50 |
| 6DF667DA | 2F7C452B | 3030002C | 34036A06 | 4442542F |
| C02D0C42 | 000A6508 | 522F002E | 0442000A | 852F002F |
| 740743EF | 00244A87 | 6A064A28 | C0056602 | 42073806 |
| 98582A18 | E8AD7809 | 9E8555CC | FFFC6502 | 4204DE85 |
| 04040009 | 44040004 | 003012C4 | 51CAFFDC | 3E0348C7 |
| 4CDF037C | 4E777E00 | 7C006100 | 00AE672A | 650E0C05 |
| 002D57C6 | 48466100 | 009E671A | 0C05002E | 66066100 |
| 00926768 | 5388003C | 00014E75 | 61000084 | 66506160 |
| 64F65246 | 617867FA | 0C05002E | 6604616E | 67FC0C05 |
| 00456630 | 61646710 | 65D2E19E | 0C05002D | 57C6E09E |
| 615466C4 | 3805614E | 660EC8FC | 000A0C44 | 07D062B4 |
| D84560EE | 4A866A02 | 4444DC44 | 53886000 | 00640C05 |
| 002E66BE | 612866BA | 610665B2 | 534660F4 | 2607E38B |
| 6516E38B | 6512E38B | 650ED687 | 650AD687 | 6506D685 |
| 65022E03 | 4E757A00 | 1A180C05 | 002B671C | 0C05002D |
| 67160C05 | 00306516 | 0C050039 | 62100205 | 000F44FC |
| 00044E75 | 44FC0000 | 4E7544FC | 00014E75 | 7A204A87 |
| 67000084 | 6B087A1F | DE875BCD | FFFC0C46 | 00126E7C |
| 0C46FFE4 | 6D6E3806 | 4444C9FC | 00062F08 | 41FA06C0 |
| DA704000 | 3C052630 | 40022057 | 2E833A07 | CAC34245 |
| 48457800 | 4843C6C7 | DA83D904 | 484736C7 | C6EF0002 |
| DA836402 | 52043A04 | 4845CED7 | 4FEF0004 | DE856B04 |
| DE875346 | 06870000 | 00806404 | E2975246 | 76093806 |
| E7666910 | 0A468000 | E6AE1E06 | 67024E75 | 7E004E75 |
| 4A446BF8 | 7EFF4846 | E216E217 | 4A07003C | 00024E75 |
| 4FEFFFFC | 2F2F0004 | 4A0740E7 | 48E73FC0 | 6602-E41 |
| 1C075BEF | 002ADC06 | 1E3C0080 | BF064886 | E2467601 |
| 41FA061C | BC506D1C | 6E0CBEA8 | 00026420 | 5C485343 |
| 601A41E8 | FFFA5243 | BC506EF6 | 67E860EC | 41E80006 |
| 5343BC50 | 6DF667DA | 1F43002D | 6BEF002C | 6A024443 |
| 4202D402 | C5031F42 | 002B7407 | 76004A87 | 6A064A28 |
| 00056602 | 4207E983 | 38069858 | 2A18E8AD | 78099E85 |
| 55CCFFFC | 65024204 | DE850404 | 00094404 | 860451CA |
| FFDE2F43 | 00264CDF | 03FC4E77 | 48E77E80 | 1F070207 |
| 007F2C3C | 80000041 | 4227BE06 | 650E6204 | BE866308 |
| 4617CD47 | 61000AE4 | 04070043 | 44070C07 | 001F6304 |
| 7C006034 | EEAF7C00 | 2A3C2000 | 000041FA | 060C7218 |
| 74016006 | E4A4DA84 | DC9C2807 | 2605E4A3 | 9E836AF0 |
| 2E045888 | 5202E28B | 51C9FFF2 | 6100040E | 2E064A1F |
| 670A2E3C | C90FDB41 | 61000886 | 1C1F4AC7 | 67060206 |
| 00808E06 | 4CDF017E | 4E752F06 | [illegible] | 61000254 |
| 691C2F07 | 2C072E3C | 80000041 | 61000A64 | 2C1F6100 |
| 08666706 | 53076802 | 7E004CDF | 00404E75 | 2F066100 |
| 022A6924 | 2F072C07 | 2E3C8000 | 00416100 | 0A3A2C1F |
| 6100083C | 67065307 | 68027EC0 | 2C072E1F | 6100081A |
| 4CDF0040 | 4E752F06 | 4A076728 | [illegible] | [illegible] |
| 692C2F07 | 2C3C8000 | 00416100 | 080A2F07 | 2E2F0004 |
| 610007EE | 2C1F6100 | 09F2588F | 2C1F4E75 | 2E3C8000 |
| 0082E217 | 60F22E3C | 80000041 | 60EA4A07 | 6A0C0207 |
| 007F6106 | 003C0002 | 4E756100 | 027648E7 | 1C006100 |

| | | | | |
|---|---|---|---|---|
| 08984CDF | 00386000 | 01963F3C | FFFE6024 | 3F3CFFFF |
| 60143F3C | 00016018 | 0C0700B8 | 6212548F | 4A074E75 |
| 42674A07 | 6BEE0C07 | 003863EE | 48E77E80 | 2407DE07 |
| 0C07008A | 634A0C07 | 00A8630C | 003C0002 | 4CDF017E |
| 548F4E75 | 2C3CA2F9 | 833E2E02 | 6100083A | 1A070205 |
| 007F0405 | 00584405 | 78FF4204 | EBAC0004 | 00FFCE84 |
| 2C3CC90F | DB436100 | 08182C07 | 2E026100 | 072C2407 |
| 283C0C90 | FDAA2E02 | 42074A02 | 6B1A0402 | 00464402 |
| 0C02001F | 63027E00 | E4AFBE84 | 6F249E84 | 9E8460F6 |
| 040200C6 | 44020C02 | 001F6302 | 7E00E4AF | 44874484 |
| BE846C06 | 9E849E84 | 60F67A00 | 2C3CEC91 | 6240283C |
| 3243F6A8 | E7876B04 | 44864484 | DE8441FA | 04147217 |
| 74FF5242 | 26052806 | E4A3E4A4 | 4A876B0C | 9A84DC83 |
| 9E9851C9 | FFEA600A | DA849C83 | DE9851C9 | FFDE322F |
| 001C6A22 | 52016630 | 613A2E06 | 2C056134 | 670C6100 |
| 08924CDF | 017E548F | 4E752E3C | FFFFFF7F | 60F06702 |
| 2C056118 | 2E064A07 | 4CDF017E | 548F4E75 | 2F056108 |
| 2F460018 | 2C1F60E6 | 28066B0E | 0C860000 | 00FF6200 |
| 01C47C00 | 4E75E084 | 5284660C | 01B860F2 | 3C1F4A06 |
| 6A047E00 | 60087EFF | E20F003C | 00024CDF | 017E4E75 |
| 2E3C8000 | 00414FEF | 001E4A07 | 4E7548E7 | 7E803F07 |
| 67EA0207 | 007F2407 | 2C3CB8AA | 3B416100 | 06E469C0 |
| 1A071C07 | 04050060 | 44050C05 | 00186FBC | 00050020 |
| 6C1EEAAF | 1E87EBAF | 1E062C3C | B1721840 | 610006BA |
| 2C072E02 | 610005CE | 24076004 | 42172E02 | 42070402 |
| 0C434402 | 0C02001F | 63027E00 | E4AF7A00 | 2C3C26A3 |
| D10041FA | 03607400 | 72036134 | 59885342 | 7209612C |
| 59885342 | 720A6124 | 4A2F0001 | 6A044485 | 4417DC85 |
| 610000FA | 2E06DE17 | 6B00FF3E | 6700FF3A | 548F4CDF |
| 017E4E75 | 52422605 | 2806E4A3 | E4A44A87 | 6B0CDA84 |
| DC839E98 | 51C9FFEA | 4E759A84 | 9C83DE98 | 51C9FFDE |
| 4E754A07 | 670E6A10 | 0207007F | 610A003C | 00024E75 |
| 7EFF60F6 | 48E77E80 | 1F071E3C | 00412C3C | 80000041 |
| 24076100 | 052ECF42 | 61000516 | 2C026100 | 071A674A |
| 04070043 | 44070C07 | 001F6302 | 7E00EEAF | 7C002A3C |
| 20000000 | 41FA02AA | 721674C1 | 6006E4A4 | 9A84DC90 |
| 28072605 | E4A39E83 | 6AF02E04 | 58885202 | E28B51C9 |
| FFF27E00 | 61000042 | 67045206 | 2E062407 | 7C001C1F |
| 04060041 | 67281206 | 6A024406 | E09E7A47 | DC865BCD |
| FFFC1C05 | 02010080 | 8C012E3C | B1721840 | 6100057A |
| 2C026100 | 04A24CDF | 017E4E75 | 78424A86 | 672E6A06 |
| 4486183C | 00C20C86 | 00007FFF | 62064846 | 0404001C |
| DC865BCC | FFFC4A06 | 6A0C0686 | 00000100 | 6404E296 |
| 52041C04 | 4E75DE87 | 670E0A07 | 0080E204 | 04070082 |
| 4847EF9F | 4E754847 | EE9F7A80 | BB07DE07 | 690A5A01 |
| 694ABB07 | E29F4E75 | 642C0C07 | 0070670E | 0C07007E |
| 660C0607 | 0085E29F | 4A0766E6 | 6000024 | FEFF4A8 |
| 67DC4A07 | 67047E00 | 60D47E00 | 60D000C0 | 00FE6610 |
| E08FE28F | 66167EFF | E217003C | 000260BA | E14F7EFF |
| E217003C | 000260AE | 7E0060AA | 00408AC7 | 2305003C |
| DE0B6B3A | 0039B1A2 | BC2F0036 | 8E1BC9BF | 0032E35F |
| A932002F | B5E620F5 | 002C9184 | F72A0028 | E8D4A510 |
| 0025BA43 | B7400022 | 9502F90C | 001EEE6B | 2800001B |
| BEBC2000 | 00189896 | 80000014 | F42400C0 | 0011C350 |
| 0000000E | 9C400000 | 000AFA0C | 00000007 | C8000000 |
| 0004A000 | 00000001 | 8000000C | FFFDCCCC | CCCDFFFA |
| A3D70A3D | FFF78312 | 6E98FFF3 | 01B71759 | FFF0A7C5 |
| AC47FFED | 8637BD06 | FFE9D6BF | 94D6FFE6 | ABCC7712 |
| FFE38970 | 5F41FFDF | DBE6FECF | FFDCAFEB | FF0CFFD9 |
| 8CBCCC09 | FFD5E12E | 1342FFD2 | B424DC35 | FFCF901D |
| 7CF7FFCB | E69594BF | FFC8B877 | AA32FFC5 | 9392EE8E |
| FFC1EC1E | 4A7EFFBE | BCE50865 | FFBB971D | A050FFB7 |
| F1C90081 | FFB4C16D | 9A01FFB1 | 9ABE14CD | FFADF796 |
| 87AEFFAA | C6120625 | FFA79E74 | 01B8FFA3 | FD87B5F3 |

| | | | | |
|---|---|---|---|---|
| 1921FB54 | 0ED63382 | 07D6DD7E | 03FAB753 | 01FF55BB |
| 00FFEAAD | 007FFD55 | 003FFFAA | 001FFFF5 | 000FFFFE |
| 0007FFFF | 0003FFFF | 0001FFFF | 0000FFFF | 00007FFF |
| 00003FFF | 00001FFF | 00000FFF | 000007FF | 000003FF |
| 000001FF | 000000FF | 0000007F | 0000003F | 0000001F |
| 0000000F | 00000007 | 1193EA7A | 082C577D | 04056247 |
| 0200AB11 | 01001558 | 008002AA | 00400055 | 0020000A |
| 00100001 | 00080000 | 00040000 | 00020000 | 00010000 |
| 00008000 | 00004000 | 00002000 | 00001000 | 00000800 |
| 00000400 | 00000200 | 00000100 | 00000080 | 00000040 |
| 00000020 | 0207007F | 6106003C | 00024E75 | 16076750 |
| 6BEEE20B | 64045203 | E28F0603 | 00204843 | 363C0017 |
| EE8F2807 | 2A072C08 | 41FAC034 | 2E3C0080 | 0C009887 |
| 04850120 | 0000600C | 07C72805 | D8842A04 | 9A989A87 |
| 5BCBFFF2 | 5ACBFFF2 | 63025287 | E18F2046 | 48431E03 |
| 4E750010 | 00000008 | 00000004 | 00000002 | 00000001 |
| 00000000 | 80000000 | 40000000 | 20000000 | 10000000 |
| 08000000 | 04000000 | 02000000 | 01000000 | 00800000 |
| 00400000 | 00200000 | 00100000 | 00080000 | 00040000 |
| 00020000 | 00010000 | 00000000 | 000048E7 | 01809E46 |
| 6F160C47 | 00086200 | 008C41F7 | 10CD0C10 | 00356418 |
| 53476670 | 41EF000E | 2F7C452B | 30300016 | 1F7C002B |
| 000C605C | 2F080C20 | 002E670E | 52100C10 | 003A664A |
| 10BC0030 | 60EC5297 | 52887E31 | 48471E10 | 484710C0 |
| 1E100C07 | 004566F4 | 0C28002B | 000156B8 | 660C5210 |
| 0C10003A | 661C5220 | 60180C68 | 3031FFFF | 6606117C |
| 002BFFFE | 53100C10 | 002F6602 | 5320205F | 0C100045 |
| 670610FC | 003060F4 | 4CDF0180 | 4E751A07 | 6B246712 |
| 42070405 | 00416B16 | 0405001F | 6A064405 | EAAF4E75 |
| 7EFFE28F | 003C0002 | 4E757E00 | 4E754207 | 040500C1 |
| 6BF40405 | 001F6A08 | 4405EAAF | 44874E75 | 66064487 |
| 4A876BD2 | 7E0008C7 | 001F003C | 00024E75 | 7A5F4A87 |
| 67306A08 | 7AE04487 | 69265305 | 0C870000 | 7FFF6206 |
| 48470405 | 0010DE87 | 5BCDFFFC | 4A076A0C | 06870000 |
| 01006404 | E2975205 | 1E054E75 | 18066752 | 0A040080 |
| 6B6A1A07 | 6B6C660E | 603E1806 | 6B5E673E | 1A076B5E |
| 67329A04 | 6B381807 | 0C050018 | 64202606 | 4203EAAB |
| 1E3C0080 | DE836504 | 1E044E75 | E2975204 | 690264F4 |
| 7EFF5304 | 1E04003C | 00024E75 | 2E061E04 | 4E754A07 |
| 4E750C05 | FFE86FF0 | 44052606 | 4207EAAF | 163C0080 |
| DE8365CC | 1E044E75 | 1A076BA6 | 67D67680 | B7C59A04 |
| 67506B3C | 0C050018 | 64CC1807 | 1E032606 | 4203EAAB |
| 9E836BA0 | 1A044207 | 53040C87 | 00007FFF | 62064847 |
| 04040010 | DE875BCC | FFFCB905 | 6B061E04 | 67024E75 |
| 7E004E75 | 0C05FFE8 | 6F8A4405 | 26072E06 | 1E3C0080 |
| 60BE1A07 | CB441E06 | 9E8667E0 | 6ABA4487 | 180560B6 |
| 1A076746 | 1806675C | DA45D844 | 7680B704 | B705DA04 |
| 69521803 | B945E25D | 42072607 | 48432806 | 4204C6C4 |
| 4844C8C7 | D8834244 | D9044844 | 48474846 | CEC64846 |
| DE846A0C | 06870000 | 00801E05 | 671A4E75 | 53056914 |
| 65127840 | DE84DE87 | 6404E297 | 52051E05 | 67024E75 |
| 7E004E75 | 6AFABD07 | 0087FFFF | FF7F4A07 | 003C0002 |
| 4E751A07 | 67541806 | 676ADA45 | D8447680 | B704B705 |
| DA046960 | 1803B945 | E25D4845 | 3A064207 | 42053805 |
| C8C74844 | 26074843 | C6C5D883 | 48462606 | C6C7D883 |
| 4244D904 | 48444847 | CEC64846 | 4845DE84 | 6A00000E |
| 06870000 | 00801E05 | 671A4E75 | 53056914 | 65127840 |
| DE84DE87 | 6404E297 | 52051E05 | 67024E75 | 7E004E75 |
| 6AFABD07 | 0087FFFF | FF7F4A07 | 003C0002 | 4E758EFC |
| 00004A86 | 661C0087 | FFFFFF7F | 4A01003C | 00024E75 |
| 48464847 | BD0760EA | 6BFA E00 | 4E751A06 | 67D82807 |
| 67E87680 | DA45D844 | B705B704 | 980569E4 | 42074847 |
| 4846BE46 | 6B065404 | 69CEE29E | 48471A03 | BB44E240 |
| 260786C6 | 3A03C6C6 | 9E834847 | 48463606 | 4203C6C5 |

```
  9E836408    26064203    DE835345    26064843    42478EC3
  48456B08    3A07DA85    53C43E05    3A070685    00000080
  2E051E04    678C4E75    0207007F    4E754A07    67040A07
  00804E75    4A066A0C    4A076A08    BC07660A    BC874E75
  BE066602    BE864E75    4A074E75    4D433638    33343320
  464C4F41    54494E47    20504F49    4E542046    49524D57
  41524520    28432920    434F5059    52494748    54203139
  38312042    59204D4F    544F524F    4C412049    4E432E00   ,>

decimal

\ FFP code is now in object area.  Attach names to dispatch table...

  here  Alternate.DP !    \ remember where we were

: flop  ( word ( offset -- )  \ adds name to vocabulary
  1 needed
  FFPBinary +  Make.Token \ compute token for the action
  bl word         \ get name of word
  Append  ;       \ add word to vocabulary

28 flop F*     \ r1\r2 -- r1*r2  most accurate, 18% slower
32 flop F/     \ r1\r2 -- r1/r2
40 flop FNEG    \ r1 -- -r1
92 flop FLOAT   \ int1 -- r1
96 flop INT     \ r1 -- int1    truncated integer
112 flop FFP>IEEE \ r1 -- ieee1   IEEE on S-stack
```

```
\ material editor

anew -mat.edit2-

  New.Window Material.Edit.Win

  8103 NEW.DIALOG.RECORD

  1 MAKE.ACTIVE.ITEM  Mat.Ok
  2 MAKE.ACTIVE.ITEM  Mat.Cancel
  3 Make.Text.Item  Mat.Name
  4 MAKE.ACTIVE.ITEM  Mat.View
  5 MAKE.ACTIVE.ITEM  Mat.Colors
  6 MAKE.ACTIVE.ITEM  Mat.Direct
  7 MAKE.ACTIVE.ITEM  Mat.Spec
  8 MAKE.Check.ITEM   Mat.Active
  9 MAKE.Check.ITEM   Mat.EnvirMap
   10 MAKE.ACTIVE.ITEM  Mat.NewMap
   11 MAKE.ACTIVE.ITEM  Mat.EditShade
   12 MAKE.ACTIVE.ITEM  Mat.ShadeVal


 NAME.DIALOG.RECORD Material.edit

 create  Material.Temp  MaterialRecord allot

: EDIT.MATERIAL.COLOR
  LOCALS| THE.INDEX |
      INIT.CURSOR                    \ arrow for picking
      THE.INDEX RGB@INDEX
      INCOLOR !RGB
      0 PROMPT INCOLOR OUTCOLOR COLORPICKER     \ picker
    IF
      OUTCOLOR @RGB
      THE.INDEX RGB!INDEX
      OUTCOLOR @RGB
      currentmaterial @ +directrgb !rgb
      SWIV.COLORS>BACKGDEVICE
      BACKGDEVICE>PALETTE
      Get.Window
      SET.PALETTE.WINDOW
      GET.KEY.WORLD                 \ update any object.rgbcolors
    THEN
  discard.activates ;


 ascii PICT constant "Pict

 : Get.Pict.File               \ presents SFgetFile, Opens file and creates a PICT handle
   0 0 LOCALS| PICT.HANDLE  FILE.ID       \ define locals
   REPLY 74 ERASE 75 75 XY>POINT       \ let system center the thing
   12 203 ResString               \ " Open PICT File "
   ' "PICT 1 REPLY (GET.FILE)        \ fetch the file
    REPLY C@ BOOLEAN DUP
    IF                     \ if not a cance....
     REPLY 6+ <W@ VOLREF# !        \ set one.shots
       IODIR OFF
     REPLY 10+ OPEN$ TO FILE.ID       \ open the file
     POST.FILE.ERROR?
     FILE.ID IF              \ if a good file...
       FILE.ID FILESIZE? 512 -
       FROM.MIN.HEAP TO PICT.HANDLE  \ allocate a handle the size of the file
       PICT.HANDLE IF          \ if a good handle ...
         PICT.HANDLE LOCK.HANDLE      lock it
```

```
      PICT.HANDLE @          \ address
      FILE.ID FILESIZE?        \ size
      512 -
      512 FILE.ID          \ offset and id
      READ.VIRTUAL         \ read to memory
      FILE.ID CLOSE          \ close the file
      POST.FILE.ERROR?       \ post error if needed
      PICT.HANDLE UNLOCK.HANDLE    \ unlock the handle
      ELSE -108 TO ERROR.FLAG      \ if bad handle post error
       DO.ERROR.ALERT
    THEN
  THEN
 THEN
 PICT.HANDLE ;


: GetEnvirMap
 0 locals| PictHandle |
 Get.Pict.File to PictHandle
 PictHandle if
   currentmaterial @ +EnvirHandle @ if
     currentmaterial @ +EnvirHandle @ to.heap
     0 currentmaterial @ +EnvirHandle !
   then
   REPLY 11 + currentmaterial @ +MaterialName 1+
   REPLY 10+ c@ 19 min cmove
   REPLY 10+ c@ 19 min currentmaterial @ +MaterialName c!
   PictHandle currentmaterial @ +EnvirHandle !
   true CurrentMaterial @ +Material_Changed !
 then
 DISCARD.ACTIVATES ;


: Check.out.Mat.edit
  Materialshandle @ @ Materials
  MaterialRecord materials# *
  compare.record if
    set.all.material.fields
    Materials Materialshandle @ @
    MaterialRecord materials# * cmove
    world.object tree.changed + changed.flag !
  then ;

: GetMatEdit
  currentmaterial @ +MaterialName
  Mat.Name
  currentmaterial @ +MaterialName c@ 1+
  cmove
  CurrentMaterial @ +Material_Type @ if
    1 Mat.Active !
  else
    0 Mat.Active !
  then
  CurrentMaterial @ +MaterialType @ 2 = if
    1 Mat.EnvirMap !
  else
    0 Mat.EnvirMap !
  then ;


: PutMatEdit
  Mat.Name
  currentmaterial @ +Material_Name
```

```
 Mat.name c@ 1+ 20 max
 cmove
 ;

: Show.Mat.Sphere                \ draws sphere.map on light.panel
 currentmaterial @
 +materialtype @ 0 > if
     black penpat
     envir.cport 2+ @ @
   get.window 2+
     envir.cport 2+ @ @ 6 +
   ' Mat.View item.rect +
   0 0 copy.bits
 else
   ' Mat.View item.rect +
   @rect
   2 + swap 2 + 2swap
   2 - swap 2 - 2swap
   frame rectangle
 then ;

: UpdateMaterialEditLight
  current.light @
  locals| the.light |
  CurrentMaterial @ +MaterialChanged @
  CurrentMaterial @ +Material_Type @ 1 = and if
    ^envir.bits @ @ 256 dup *
    CurrentMaterial @ +MaterialColorIndex @
    KEY.COLOR.RES @ *
    KEY.COLOR.RES @ 1 - + fill          \ fill the map with the base color
    lights# 0 do
      I SetCurrentLight
      Light.Type @ 1 and if
        calc.material.direct
        Show.Mat.Sphere
        Light.Type @ 2 and not if
          calc.material.specular
        then
      then
    loop
    average.sphere
    Show.Mat.Sphere
    the.light current.light !
    CurrentMaterial @ +MaterialChanged @
  then
  CurrentMaterial @ +MaterialChanged @
  CurrentMaterial @ +MaterialType @ 2 = and if
    DRAW.ENVIR.PICT
    Show.Mat.Sphere
  then
  CurrentMaterial @ +MaterialChanged @
  CurrentMaterial @ +MaterialType @ 0 = and if
    ' Mat.View item.rect +
    @rect
    2 + swap 2 + 2swap
    2 - swap 2 - 2swap
    4dup black pattern rectangle
    frame rectangle
  then
  False CurrentMaterial @ +MaterialChanged ! ;


: UpdateMatDirect
  CurrentMaterial @ +DirectReflect
```

```
  ' Mat.Direct item.rect +
  UpdateScaleControl ;


: Do.Mat.Direct
  0 LOCALS| THE.RECT C.ITEM HIT.ITEM C.RECORD |
  CurrentMaterial @ +DirectReflect
  ' Mat.Direct item.rect +
  handle.scale.control if
    watch set.cursor
    TRUE CurrentMaterial @ +MaterialChanged !
    UpdateMaterialEditLight
    init.cursor
  then  ;

find Do.Mat.Direct Mat.Direct !


: UpdateMatSpec
  CurrentMaterial @ +SpecularReflect
  ' Mat.Spec item.rect +
  UpdateScaleControl ;


: Do.Mat.Spec
  0 LOCALS| THE.RECT C.ITEM HIT.ITEM C.RECORD |
  CurrentMaterial @ +SpecularReflect
  ' Mat.Spec item.rect +
  handle.scale.control if
    watch set.cursor
    TRUE CurrentMaterial @ +MaterialChanged !
    UpdateMaterialEditLight
    init.cursor
  then  ;

find Do.Mat.Spec Mat.Spec !


: Color.Rect
  ' Mat.Colors item.rect +
  0 locals| the.size the.rect the.index
  the.index
  256 key.color.res @ / 1- min
  to the.index
  the.rect 4 + w@ the.rect w@   -
  SWIV.COLORS @ @ +CTSIZE W@ 1+ / to the.size
  the.rect @rect temp.rect !rect
  temp.rect W@
  the.index the.size * + dup
  temp.rect W!
  the.size + 1+
  temp.rect 4 + W!
  temp.rect ;

: HiLiteColorRect
  Locals| the.index |
  the.index Color.Rect
  @rect
  2- swap 2- 2swap 2+ swap 2+ 2swap
  frame rectangle ;


: update.colors
  8 penmode
```

```
0 0 xyoffset
monochrome? if
  ' Mat.Colors item.rect - @rect
  swap 2swap swap 2swap
  4dup
  white pattern rectangle
  frame rectangle
else
  SWIV.COLORS @ @ +CTSIZE W@ 1+ 0 do
    I RGB@INDEX
      TEMP.RGB !RGB
    TEMP.RGB RGBFORECOLOR
    I Color.Rect
    @rect swap 2swap swap 2swap
    4dup
    black pattern rectangle
    Black.rgb RGBFORECOLOR
    frame rectangle
  loop
  CurrentMaterial @
  +MaterialColorIndex @
  HiLiteColorRect
then ;


: handle.color.hit
  CurrentMaterial @
  +MaterialColorIndex @
  LOCALS| THE.INDEX C.ITEM HIT.ITEM C.RECORD
  monochrome? 0= if
    SWIV.COLORS @ @ +CTSIZE W@ 1- 0 do
      @Mouse.Dn I Color.Rect ptinrect if
        I CurrentMaterial @
        +MaterialColorIndex !
        I rgb@index
        currentmaterial @ +directrgb !rgb
      then
    loop
    THE.INDEX
    CurrentMaterial @
    +MaterialColorIndex @ = NOT IF
      update.colors
      CurrentMaterial @
      +MaterialColorIndex @
      HiLiteColorRect
      watch set.cursor
      TRUE CurrentMaterial @ +MaterialChanged !
      UpdateMaterialEditLight
      init.cursor
    THEN
  then ;

find handle.color.hit mat.colors '


: Do.color.clicks
  monochrome? 0= if
    SWIV.COLORS @ @ +CTSIZE W@ 1- 1 do       \ don't edit white
      @Mouse.Dn I Color.Rect ptinrect if
        I CurrentMaterial @
        +MaterialColorIndex !
        I EDIT.MATERIAL.COLOR
        update.colors
        Show.Mat.Sphere
```

```
      init.cursor
    then
  loop
then ;

: DO.Mat.CANCEL                 \ cancel current dialog
  LOCALS| C.ITEM HIT.ITEM C.RECORD
    DROP 1                  \ drop the cancel and set ok to exit
  Material.Temp
  CurrentMaterial @
  MaterialRecord cmove
  watch set.cursor
  TRUE CurrentMaterial @ +Material_Changed !
  UpdateMaterialEditLight
  init.cursor
  Material.edit.win CLOSE.DIALOG        \ since this is modeless... close the window
  DPOP DROP ;

FIND DO.Mat.CANCEL Mat.cancel  !        \ set as token for cancel button

: DO.Mat.Ok                  \ quit and save current dialog
  LOCALS| C.ITEM HIT.ITEM C.RECORD
    DROP 1                  \ drop the cancel and set ok to exit
  Material.edit GET.ITEM.DATA      \ if deactivated fetch changes
  PutMatEdit
  Check.out.Mat.edit
  Material.edit.win CLOSE.DIALOG        \ since this is modeless... close the window
  DPOP DROP ;

FIND DO.Mat.Ok Mat.ok  !    \ set as token for cancel button

: Update.Material.edit
  ' Mat.Direct item.rect +
  @rect swap 2swap swap 2swap
  white pattern rectangle
  ' Mat.Spec item.rect +
  @rect swap 2swap swap 2swap
  white pattern rectangle
  Show.Mat.Sphere
  update.colors
  UpdateMatDirect
  UpdateMatSpec
  Material.edit.win DRAW.DIALOG  ;

: do.Mat.EnvirMap
  LOCALS| C.ITEM HIT.ITEM C.RECORD
   C.RECORD HIT.ITEM C.ITEM
   ^HANDLE.CHECK execute
   C.ITEM ITEM.BOOL + @
   if
     CurrentMaterial @ +MaterialType @ if
       2 CurrentMaterial @ +MaterialType !
     then
   else
     CurrentMaterial @ +MaterialType @ if
       1 CurrentMaterial @ +MaterialType !
       currentmaterial @ +EnvirHandle @ if
         currentmaterial @ +EnvirHandle @
         to.heap
         0 currentmaterial @ +EnvirHandle !
```

```
      then
    then
  then
  watch set.cursor
  TRUE CurrentMaterial @ +MaterialChanged !
  UpdateMaterialEditLight
  init.cursor
  ;

find do.Mat.EnvirMap ' Mat.EnvirMap ITEM.HANDLER.TOKEN + !


: do.mat.active
  LOCALS| C.ITEM HIT.ITEM C.RECORD |
  C.RECORD HIT.ITEM C.ITEM
  ^HANDLE.CHECK execute
  C.ITEM ITEM.BOOL + @
  if
    NewMaterial
    AddMaterial
    CurrentMaterial @
    Material.Temp
    MaterialRecord cmove
    currentmaterialindex @
    setcurrentmaterial
    currentmaterialindex @
    object.material.index place
  else
    DisposeMaterial
    CurrentMaterial @
    Material.Temp
    MaterialRecord cmove
    currentmaterialindex @
    setcurrentmaterial
  then
  watch set.cursor
  TRUE CurrentMaterial @ +MaterialChanged !
  UpdateMaterialEditLight
  Update.Material.edit
  GetMatEdit
    Material.edit SET.ITEMS          \ set booleans, text
  init.cursor
  ;

find do.mat.active ' mat.active ITEM.HANDLER.TOKEN + !



: do.NewEnvirmap
  LOCALS| C.ITEM HIT.ITEM C.RECORD
  CurrentMaterial @ +MaterialType @ if
    GetEnvirMap
    currentmaterial @ +EnvirHandle @ if
      2 CurrentMaterial @ +MaterialType !
    then
    watch set.cursor
    TRUE CurrentMaterial @ +MaterialChanged !
    UpdateMaterialEditLight
    init.cursor
    Update.Material.edit
    GetMatEdit
      Material.edit SET.ITEMS          \ set booleans, text
  then
  ;
```

```
find do.NewEnvirmap Mat.NewMap !

 : Do.Mat.ShadeVal
    LOCALS| C.ITEM HIT.ITEM C.RECORD
    DO.SHADE.EDIT ;

   find Do.Mat.ShadeVal Mat.ShadeVal !

  : Do.Mat.EditShade
    LOCALS| C.ITEM HIT.ITEM C.RECORD |
    Do.Shader.Panel ;

   find Do.Mat.EditShade Mat.EditShade !


: DO.Material.edit
    Material.edit
   LOCALS|  C.DIALOG |
   IF Material.edit.win DPUSH          \ push current dialog on a stack
     Materials Materialshandle @ @
     MaterialRecord materials# * cmove      \ set materials current
     CurrentMaterial @
     Material.Temp
     MaterialRecord cmove
     GetMatEdit
     C.DIALOG GET.ITEMS              \ fetch item handles, rects
       C.DIALOG SET.ITEMS              \ set booleans, text
      BEGIN                     \ start of event handling
     DO.EVENTS
     DOUBLE.CLICK IF
       do.color.clicks
     THEN drop
     ?KEYSTROKE IF DROP THEN          \ handle keystrokes
     DIALOG.EVENT?                \ check for dialog events
       IF SWAP DGET = IF            \ if dialog event check for current
         C.DIALOG HANDLE.ITEMS         \ if current handle items
       THEN
       ELSE 2DROP THEN             \ else drop dialog event args
     AGAIN                     \ endless loop until deactivated
    ELSE
     C.DIALOG GET.ITEM.DATA           \ if deactivated fetch changes
     PutMatEdit
     Check.out.Mat.edit
     DPOP DROP
     Material.edit.win CLOSE.DIALOG

  THEN  ;


: Init.Material.edit
   0 LOCALS| D.HAND |
   ASCII DLOG 8103 GET.RESOURCE TO D.HAND
   D.HAND 0 = NOT IF
    D.HAND @ @RECT
    UP.RIGHT.on.screen
    D.HAND @ !RECT
   THEN
   Material.Edit.Win On.Activate  Do.Material.edit
   Material.Edit.Win On.Update Update.Material.edit
    ;


: Reset.Material.edit
```

```
Init.Material.edit
ASCII DLOG 8103 GET.RESOURCE IF
8103 Material.Edit.win ADD.DIALOG
then ;
```

```
\ materials panel

anew -materials.panel-

0 constant ^material.edit

11 constant matyborder
10 constant matxborder
10 constant matspace
50 constant matdiameter
 3 constant matrows
materials# matrows / constant matcolumns

global mat.id 0 to mat.id


 NEW.WINDOW Material.win
 " Materials"                    Material.win  W.TITLE
 100 100
 100 matyborder +
 matdiameter matspace + matrows * +
 matspace +
 100
 matdiameter matspace + matcolumns * +
 matspace +                  Material.win  W.BOUNDS
 2                       Material.win  W.TYPE
 W/COLOR                     Material.win  W.ATTRIBUTES


 create Material.close 2 w, 4 w, 8 w, 10 w,

 : draw.material.top
   0 11 move.to
   1000 11 draw.to
   Material.close @rect
   swap 2swap swap 2swap
   frame rectangle
   15 2 move.to
   1000 2 draw.to
   15 4 move.to
   1000 4 draw.to
   15 6 move.to
   1000 6 draw.to
   15 8 move.to
   1000 8 draw.to ;

 : track.rect
     -1 locals| in.flag the.rect
     the.rect (invert.rect)
     begin
       @mouse the.rect
       ptinrect if
         in.flag not if
           the.rect (invert.rect)
             -1 to in.flag
         then
       else
         in.flag if
           the.rect (invert.rect)
             0 to in.flag
         then
       then
     mouse.button not until
```

```
in.flag if
  the.rect (invert.rect)
then
@mouse the.rect ptinrect ;


: Material.Rect
 locals| the.id |
   matyborder matspace +
 matdiameter matspace +
  the.id matcolumns / * +
 matspace
 matdiameter matspace +
  the.id matcolumns mod * +
  2dup matdiameter +
  swap matdiameter +
  swap temp.rect !rect
  temp.rect ;


: Draw.Material
    BLACK PENPAT
    CurrentMaterial @ +Materialtype @ if
    ENVIR.CPORT 2+ @ @
    get.window 2+
        ENVIR.CPORT 2+ @ @ 6 +
    CurrentMaterialIndex @
    Material.Rect
      0 0 COPY.BITS
  else
    CurrentMaterialIndex @
    Material.Rect @rect swap 2swap swap 2swap
      white pattern rectangle
  then
  CurrentMaterialIndex @
  Material.Rect @rect swap 2swap swap 2swap
    frame rectangle ;


: Hit.Material?
  CurrentMaterialIndex @
  0 locals| the.flag the.mat
  Materials# 0 do
    I setcurrentmaterial
    @Mouse.Dn
      CurrentMaterialIndex @
      Material.Rect PtInRect if
      -1 to the.flag
      CurrentMaterialIndex @ to the.mat
    then
  loop
  the.mat setcurrentmaterial
  the.flag ;

: Check.Out.Materials            \ handle materials changes
  Object.Material.Index Pluck
  mat.id = not if
    Set.Material.Fields
    changed.flag @
    world.object tree.changed + = not if
      Current.Object @
      just.object.changed -
```

```
    changed.flag !
  then
then ;

: check.in.materials
 Object.Material.Index Pluck
 setcurrentmaterial
 Object.Material.Index Pluck to MAT.ID ;


: do.material.clicks
 Hit.Material?
 currentmaterialindex @ 0 = not         \ white will not be edited
 and if
   CurrentMaterial @ +MaterialType @ if
     CurrentMaterialIndex @
     Object.Material.Index Place
   then
   Check.Out.Materials
   Reset.Material.edit
 then ;


: Hilite.Rect
 locals| the.index |
 the.index Material.Rect
 @rect
 2+  swap 2+ 2swap
 2 - swap 2 - 2swap
 frame rectangle ;

global last.rect

 : Hilite.Material
  10 penmode
  last.rect -1 > if
    last.rect Hilite.Rect
  then
  CurrentMaterialIndex @
  Hilite.Rect
  CurrentMaterialIndex @
  to last.rect
  8 penmode ;


: do.material.select
 Hit.Material? if
   Hilite.Material
   CurrentMaterial @ +MaterialType @ if
     CurrentMaterialIndex @
     Object.Material.Index Place
   then
 else
   >DRAG.WINDOW
 then  ;

: update.material.panel
 8 penmode
 draw.palette.top
 CurrentMaterialIndex @
 locals| the.mat |
 Materials# 0 do
   I setcurrentmaterial
   Draw.Material
```

```
  loop
  the.mat setcurrentmaterial
  CurrentMaterialIndex @
  Hilite.Rect
  CurrentMaterialIndex @
  to last.rect  ;


: do.material.close
  @MOUSE.DN Material.CLOSE PTINRECT IF
    Material.CLOSE TRACK.RECT IF
      Check.out.materials
      Material.WIN CLOSE.WINDOW
    then
  then
  ;


: do.material.panel
  IF
    WINDOW.REGION.EMPTY
    INIT.CURSOR
    check.in.materials
    update.material.panel
    BEGIN
      DO.EVENTS
      DOUBLE.CLICK IF
        do.material.clicks
      THEN
      MOUSE.DOWN = IF
        do.material.select
        do.material.close
      THEN
    AGAIN
  ELSE
      Check.out.materials
  THEN
  ;


: InitMaterialPanel
  Material.win on.update update.material.panel
  Material.win on.activate do.material.panel
  Material.win add.window ;


: DO.OBJECT.COLOR.PALETTES
  LOCALS| THE.MOUSE |
  CURRENT.OBJECT @ WORLD.OBJECT = IF
    THE.MOUSE DO.COLOR.PALETTE
  ELSE
      InitMaterialPanel
  THEN ;

\ patches

 Token.for  DO.OBJECT.COLOR.PALETTES ' ^DO.COLOR.PALETTE !
```

```
\ materials handling file

anew -materials-

cr ." Loading Materials Handling "

24 CONSTANT materials#

Structure MaterialRecord
  Long: +MaterialType
  Long: +MaterialChanged
  Long: +MaterialMap
  Long: +EnvirHandle
  Long: +DirectReflect
  Long: +SpecularReflect
  Long: +MaterialColorIndex
 3 Shorts: +DirectRGB
 3 Shorts: +SpecularRGB
 3 Shorts: +AmbiantRGB
20 Bytes: +MaterialName
  Long: +ShaderIndex
  Long: +Opacity
  Long: +ShaderVar1
  Long: +ShaderVar2
  Long: +ShaderVar3
  Long: +ShaderVar4
3 Shorts: +ShaderColor
Structure.end

create MaterialsHandle 0 ,

create Materials MaterialRecord materials# * allot
     Materials MaterialRecord materials# * erase

create Grey.rgb  cos.scaler 3 4 */ w, cos.scaler 3 4 */ w, cos.scaler 3 4 */ w,
create Default.AmbiantRGB  0 w, 0 w, 0 w,


create AmbiantRGB  0 w, 0 w, 0 w,
create CurrentMaterial 0 ,
create CurrentMaterialIndex 0 ,
create MaterialName ," Plastic"
0 constant ^LightDisplay


 : CurrentShader
  CurrentMaterial @ +ShaderIndex ;



 : GetShaderRec
  0 locals| theptr N theHandle
  theHandle @ c@ 1+
  theHandle @ + 8 -          \ skip material name and Ks, Kd flags
  to thePtr
  N 0 do
    thePtr 8 + to thePtr
    thePtr c@ 1+
    thePtr + to thePtr
    thePtr c@ 1+
    thePtr + to thePtr

  loop
  thePtr
```

```
;

: SetShaderDefaults
0 0 locals| theRec theSHAD
ASCII ZSHD CurrentShader @ 1+ Get.Resource to theSHAD
theSHAD if
  theSHAD 0 GetShaderRec to theRec
  theRec 4+ @ currentmaterial @ +ShaderVar1 !
  theSHAD 1 GetShaderRec to theRec
  theRec 4+ @ currentmaterial @ +ShaderVar2 !
  theSHAD 2 GetShaderRec to theRec
  theRec 4+ @ currentmaterial @ +ShaderVar3 !
then
;

: Make.Default.Material
  CurrentMaterial @ +MaterialType @ 0= if
    CurrentMaterial @ materialrecord erase
    1 CurrentMaterial @ +MaterialType !
    cos.scaler 6 10 */
    CurrentMaterial @ +DirectReflect !
    cos.scaler 2 /
    CurrentMaterial @ +SpecularReflect !
    0 CurrentMaterial @ +MaterialColorIndex !
    white.rgb @rgb
    CurrentMaterial @ +SpecularRGB !rgb
    white.rgb @rgb
    CurrentMaterial @ +DirectRGB !rgb
    Default.AmbiantRGB @rgb
    CurrentMaterial @ +AmbiantRGB !rgb
    MaterialName
    CurrentMaterial @ +MaterialName
    MaterialName c@ 1+ 20 min cmove
    0 CurrentMaterial @ +ShaderIndex !
    SetShaderDefaults
    Cos.Scaler CurrentMaterial @ +Opacity !
  then ;

: AddMaterial
  CurrentMaterial @ +MaterialType @ if
    CurrentMaterial @ +MaterialMap @ 0 = if
      256 256 * HEAP.VARIABLE
        drop CurrentMaterial @ +MaterialMap !
    then
    CurrentMaterial @ +MaterialMap @ 0 = if
      0 CurrentMaterial @ +MaterialType !
      False CurrentMaterial @ +MaterialChanged !
      -108 to error.flag
    else
      True CurrentMaterial @ +MaterialChanged !
    then
  then
  ;

: NewMaterial
  Make.Default.Material
  AddMaterial ;

: DisposeMaterial
  CurrentMaterial @ +MaterialMap @ if
```

```
    CurrentMaterial @ +MaterialMap @
    Unlock.Handle
    CurrentMaterial @ +MaterialMap @
    to.heap
  then
  CurrentMaterial @ MaterialRecord erase
  ;

: SetCurrentMaterial                \ sets the current material
  0 max
  dup materials# 1- > if
    drop 0
  then                       \ limit to range of array
  dup CurrentMaterialIndex !
  MaterialRecord *              \ calc pointer to array
  Materials +
  CurrentMaterial !
  CurrentMaterial @ +MaterialType @ 0 >
  CurrentMaterial @ +MaterialMap  @ and if
    CurrentMaterial @ +MaterialMap @ @
    127 256 * + 127 +
    PolyBlock +mapbuff !
    ENVIR.CPORT ^PIX.MAP.OF if
      CurrentMaterial @ +MaterialMap @ @
      ENVIR.CPORT ^PIX.MAP.OF @ baseadd !
    then
    CurrentMaterial @ +MaterialMap @
    ^envir.bits !
  else
    Materials +MaterialMap @ @
    127 256 * + 127 +
    PolyBlock +mapbuff !
    ENVIR.CPORT ^PIX.MAP.OF if
      materials +MaterialMap @ @
      ENVIR.CPORT ^PIX.MAP.OF @ baseadd !
    then
    Materials +MaterialMap @
    ^envir.bits !
  then ;

: calc.material.specular            \ sets the specular reflection for this light
  0 0 0 locals| rol.angle pitch.angle yaw.angle
  CurrentMaterial @ +MaterialMap @ if      \ only if map exists
  SET.LCOS                    \ sets the cosine from light.vector
  yaw.cos @ yaw.sin @ angle           \ find the angle
  MAKE.NEG.ANGLE to yaw.angle         \ use shortest path around
  pitch.cos @ pitch.sin @ angle
  MAKE.NEG.ANGLE  to pitch.angle        \ do the same for pitch
  yaw.angle  2/  yaw
  pitch.angle  2/  pitch            \ set the cosines for new vector
  0  rol
  0 0 1000
  swivel                    \ swivel the vector
  normalize                   \ normalize the vector
  KEY.COLOR.RES @
  cos.scaler 4 - 255 */             \ calc the scale for color resolution
  direct.scale @  cos.scaler  */        \ calc the scale for direct light brightness
  CurrentMaterial @ +SpecularReflect @
  cos.scaler */
  CurrentMaterial @ +MaterialColorIndex @
  dup 256 KEY.COLOR.RES @ / 1- > if       \ limit to available range
    drop 0
```

```
then
KEY.COLOR.RES @ *
write.sphere.hilight drop 2drop        \ write the highlight on the map
then ;


:  calc.material.direct             \ makes a new sphere map
CurrentMaterial @ +MaterialMap @ if     \ only if map exits
light.vector to.stack               \ put light vector on stack
KEY.COLOR.RES @ cos.scaler 4 - 255 */      \ calc the scale for color resolution
direct.scale @  cos.scaler */         \ calc the scale for direct light brightness
CurrentMaterial @ +DirectReflect @      \ scale to the current color
cos.scaler */
CurrentMaterial @ +DirectRGB
RGB>Reflectance
cos.scaler */
CurrentMaterial @ +MaterialColorIndex @
dup 256 KEY.COLOR.RES @ / 1- > if       \ limit to available range
  drop 0
then
KEY.COLOR.RES @ *
write.sphere.light drop 2drop          \ write the direct light in map
then ;


: (DRAW.ENVIR.PICT)
   ENVIR.DIAMETER 2/ DUP
   0 0 0 0 LOCALS| TY1 TX1 TY2 TX2 PICTY PICTX Pict.Handle
   Pict.Handle 0 = not IF
   Pict.Handle @ 2+ @RECT
   TO TX2
   TO TY2
   TO TX1
   TO TY1
   TY2 TY1 - TO TY1
   TX2 TX1 - TO TX1
   PICTY TY1 2/ -
   PICTX TX1 2/ -
   PICTY TY1 DUP 2/ - +
   PICTX TX1 DUP 2/ - +
   TEMP.RECT !RECT
   Pict.Handle
   TEMP.RECT
   DRAW.PICTURE
  THEN ;


   : DRAW.ENVIR.PICT
   GET.WINDOW
   LOCALS| C.WINDOW  |
   ^ENVIR.BITS @  0 = NOT IF
    ENTER.CURRENT.BACKPORT
    ENVIR.CPORT  WINDOW
   0 0 ENVIR.DIAMETER DUP BLACK PATTERN RECTANGLE
   currentmaterial @ +EnvirHandle @ if
     currentmaterial @ +EnvirHandle @
       (DRAW.ENVIR.PICT)
   then
   EXIT.CURRENT.BACKPORT
     DO.ERROR.ALERT
   C.WINDOW (WINDOW)
   THEN ;

: UpdateMaterialLight
```

```
current.light @ light.record ;
locals| the.light |
CurrentMaterial @ +MaterialChanged @
CurrentMaterial @ +MaterialType @ 1 = and if
  ^envir.bits @ @ 256 dup *
  CurrentMaterial @ +MaterialColorIndex @
  KEY.COLOR.RES @ *
  KEY.COLOR.RES @ 1 - + fill        \ fill the map with the base color
  lights# 0 do
    I SetCurrentLight
    Light.Type @ 1 and if
      calc.material.direct
      Light.Type @ 2 and not if
        calc.material.specular
      then
    then
  loop
average.sphere
then
CurrentMaterial @ +MaterialChanged @
CurrentMaterial @ +MaterialType @ 2 = and if
  DRAW.ENVIR.PICT
then
False CurrentMaterial @ +MaterialChanged !
the.light SetCurrentLight ;


: SetMaterialsChanged
  CurrentMaterialIndex @
  locals| the.mat |
  Materials# 0 do
    I setcurrentmaterial
    True CurrentMaterial @ +MaterialChanged !
  loop
  the.mat setcurrentmaterial ;

: TestPrimeMaterial
  0 setcurrentmaterial
  CurrentMaterial @ +MaterialMap @ 0= if
    Make.Default.Material
    AddMaterial
    CurrentMaterial @ +MaterialMap @ 0= if
      4  201 ResString      \ " Unable to update materials! Out of Memory, Try Resizing Workspace"
      "" "" "" 104 IssueAlert drop
    then
  then ;

: (UpdateMaterials)
  CurrentMaterialIndex @
  locals| the.mat |
  watch set.cursor
  TestPrimeMaterial
  Materials# 0 do
    I setcurrentmaterial
    UpdateMaterialLight
  loop
  the.mat setcurrentmaterial
  init.cursor ;


: AddMaterials
  Materials# 0 do
    I setcurrentmaterial
    AddMaterial
```

```
  loop
  init.cursor
  0 setcurrentmaterial ;


: Init.Materials
  materials
  MaterialRecord materials# * erase     \ erase the.record
  0 setcurrentmaterial
  Make.Default.Material           \ make white plastic as 0

  1 setcurrentmaterial
  Make.Default.Material
  cos.scaler 3 4 */
  CurrentMaterial @ +DirectReflect !
  cos.scaler 3 4 */
  CurrentMaterial @ +SpecularReflect !
  1 CurrentMaterial @ +MaterialColorIndex !    \ make clay material
  52992 49695 38373
  CurrentMaterial @ +DirectRGB !RGB

  2 setcurrentmaterial
  Make.Default.Material
  cos.scaler 2/
  CurrentMaterial @ +DirectReflect !
  cos.scaler 7 8 */
  CurrentMaterial @ +SpecularReflect !
  2 CurrentMaterial @ +MaterialColorIndex !    \ make red plastic material
  52992 5802 7318
  CurrentMaterial @ +DirectRGB !RGB

  3 setcurrentmaterial
  Make.Default.Material
  cos.scaler 2/
  CurrentMaterial @ +DirectReflect !
  cos.scaler 7 8 */
  CurrentMaterial @ +SpecularReflect !
  3 CurrentMaterial @ +MaterialColorIndex !    \ make blue plastic material
  18898 12739 52992
  CurrentMaterial @ +DirectRGB !RGB

  AddMaterials
  MaterialRecord materials# *
  from.min.heap MaterialsHandle !
  MaterialsHandle @ if
    Materials MaterialsHandle @ @
    MaterialRecord materials# * cmove
  else
    -108 to error.flag
  then  ;


: SET.ABSOLUTE.LIGHTS
  current.light @ light.record /
  locals| the.light |
  lights# 0 do
    I SetCurrentLight
    Light.Type @ 1 and if
      (SET.ABSOLUTE.LIGHT.VECTOR)
    then
  loop
  LightHand @ @ lights Light.Record lights# * compare.record
  if
```

```
    lights LightHand @ @ Light.Record lights# * cmove
    SetMaterialsChanged
  then
  the.light SetCurrentLight  ;

: disposeMaterials
  CurrentMaterialIndex @
  locals| the.mat |
  MaterialsHandle @ if
    MaterialsHandle @ to.heap
    0 MaterialsHandle !
  then
  Materials# 0 do
    I setcurrentmaterial
    CurrentMaterial @ +MaterialMap @ if
      CurrentMaterial @ +MaterialMap @ unlock.handle
      CurrentMaterial @ +MaterialMap @ to.heap
      0 CurrentMaterial @ +MaterialMap !
      0 CurrentMaterial @ +MaterialType !
    then
  loop
  materials
  MaterialRecord materials# * erase   \ erase the.record
  the.mat setcurrentmaterial
   ;

: set.maps.nil
  CurrentMaterialIndex @
  locals| the.mat |
  Materials# 0 do
    I setcurrentmaterial
    0 CurrentMaterial @ +MaterialMap !
  loop
  the.mat setcurrentmaterial ;

: get.envir.maps
  CurrentMaterialIndex @
  locals| the.mat |
  Materials# 0 do
    I setcurrentmaterial
    CurrentMaterial @ +MaterialType @ 2 = if
      Ascii EMAP
      CurrentMaterial @ +MaterialName
      Get.Named.Resource ?dup if
        dup CurrentMaterial @ +EnvirHandle !
        detach.resource
      else
        0 CurrentMaterial @ +EnvirHandle !
      then
    then
  loop
  the.mat setcurrentmaterial ;


: Put.envir.maps
  CurrentMaterialIndex @
  locals| the.mat |
  Materials# 0 do
    I setcurrentmaterial
    CurrentMaterial @ +MaterialType @ 2
    CurrentMaterial @ +EnvirHandle @ 0   not and if
      CurrentMaterial @ +EnvirHandle @
      Ascii EMAP
      CurrentMaterialIndex @ 128 -
```

```
    CurrentMaterial @ +Materia.Name
    add.resource
    Res.Error ?dup if
      to error.flag
    then
    CurrentMaterial @ +EnvirHandle @
    write.resource
    CurrentMaterial @ +EnvirHandle @
    detach.resource
  then
loop
the.mat setcurrentmaterial ;


: get.materials
  disposeMaterials
  Ascii MATR 128 Get.Resource MaterialsHandle !
  MaterialsHandle @ 0 > if
    MaterialsHandle @ detach.resource
    MaterialsHandle @ @ Materials
    MaterialRecord materials# * cmove
    set.maps.nil
    addmaterials
    get.envir.maps
  else
    False Materials.Exist !
    Init.Materials
  then
  SetMaterialsChanged ;


: Put.Materials
  MaterialsHandle @ if
    MaterialsHandle @
    Ascii MATR
    128 ""
    Add.Resource
    Res.Error ?dup if
      to error.flag
    then
    MaterialsHandle @ write.resource
    MaterialsHandle @ detach.resource
    Put.envir.maps
  then ;


\ set the object fields

: set.material.fields
  currentmaterialindex @
  locals| the.mat |
  current.object @ world.object   not if
    object.material.index place
    setcurrentmaterial
    CurrentMaterial @ +MaterialColorIndex @
    object.palette.index place
    currentmaterial @ +DirectRGB @rgb
    object.rgbcolor drop !rgb
    currentmaterial @  +DirectReflect @
    object.direct.scale place
    currentmaterial @  +SpecularReflect @
    object.specular.scale place
    set.reflect               \ in interface.utils
    currentmaterial @  +Material.Name
```

```
    OBJECT.MATERIAL.NAME move.record
    CurrentMaterial @ +MaterialType @
    OBJECT.MATERIAL.TYPE PLACE
    Object.Changed
  then
  the.mat setcurrentmaterial ;


: set.all.material.fields
  operation @
  current.object @
  CurrentMaterialIndex @
  locals| the.mat the.ob the.op |
  token.for set.material.fields operation !
  world.object set.current.object
  traverse.down.tree
  the.op operation !
  the.ob set.current.object
  the.mat setcurrentmaterial
  TRUE FILE.CHANGED !
;


\ conversion for old RGB into materials


: ColorIndex>MatIndex
  Object.Palette.Index pluck
  setcurrentmaterial
  current.object @ world.object - not
  currentmaterialindex 0 > and
    CurrentMaterial @ +MaterialType @ 0= and if
    Make.Default.Material
    object.rgbcolor drop @rgb
    CurrentMaterial @ +DirectRGB !rgb
  then
  currentmaterialindex @ DUP
  object.material.index place
  currentmaterial @ +MaterialColorIndex !  ;


: Convert2Materials
  operation @
  current.object @
  locals| the.ob the.op |
  disposeMaterials
  materials
  MaterialRecord materials# * erase    \ erase the.record
  0 setcurrentmaterial
  Make.Default.Material
  Token.for ColorIndex>MatIndex operation !
  world.object set.current.object
  Traverse.down.tree
  AddMaterials
    MaterialRecord materials# *
  from.min.heap MaterialsHandle !
  MaterialsHandle @ if
    Materials MaterialsHandle @ @
    MaterialRecord materials# * cmove
  else
    -108 to error.flag
  then
  the.op operation !
  the.ob set.current.object
```

```
  set.all.material.fields
  SetMaterialsChanged ;


\ finds materials actually used
\ and allocates them


  : ObjectMaterialMatch
    Object.Palette.index pluck
    currentmaterial @ +materialcolorindex @ =
    OBJECT.SPECULAR.SCALE pluck
    currentmaterial @ +SpecularReflect @ = and
    OBJECT.Direct.SCALE pluck
    currentmaterial @ +DirectReflect @ = and
    currentmaterial @ +MaterialName
    OBJECT.MATERIAL.NAME compare.record 0= and
    CurrentMaterial @ +MaterialType @
    OBJECT.MATERIAL.TYPE PLUCK = and ;


  : MakeObjectMaterial
    current.object @ world.object - not if
    currentmaterialindex @
    object.material.index place
    object.palette.index pluck
    CurrentMaterial @ +MaterialColorIndex !
    object.rgbcolor drop @rgb
    currentmaterial @ +DirectRGB !rgb
    object.direct.scale pluck
    currentmaterial @ +DirectReflect !
    object.specular.scale pluck
    currentmaterial @ +SpecularReflect !
    OBJECT.MATERIAL.NAME
    currentmaterial @ +MaterialName swap move.record
    OBJECT.MATERIAL.TYPE pluck
    CurrentMaterial @ +MaterialType !
  then ;


  : AddObjectMaterial
    0 locals| flag |
    Materials# 0 do
      I setcurrentmaterial
      ObjectMaterialMatch if
        true to flag
        currentmaterialindex @
        object.material.index place
      then
    loop
    flag 0= if
      Materials# 0 do
        I setcurrentmaterial
        currentmaterial @
        +materialtype @ 0= flag 0= and if
          true to flag
          MakeObjectMaterial
        then
      loop
    then
    ;
```

```
: AddWorldMaterials
  operation @ current.object @
  locals! the.ob the.op
  Put.envir.maps
  disposeMaterials
  0 setcurrentmaterial
  Make.Default.Material
  token.for AddObjectMaterial operation !
  traverse.down.tree
  addmaterials
  get.envir.maps
  addmaterials
  SetMaterialsChanged
  the.op operation !
  the.ob set.current.object ;
```

```
\ New Printing - PrintCalls library
\ Last Revision: 05/23/88  10:29:35 PM   YH
\ fixes for Hi Printing by Young Harvill
\ having problems posting errors if LaserPrinter warming up


forth definitions decimal
ANEW   --NewPrinting--

cr ." Loading library New Printing..."

8000 minimum.object
2000 minimum.vocab



find SlideResult
not iftrue
  <code SlideResult   \ sign extend word in upper bytes,
           \ replace long on stack
    popwa0, dropw, pusha0, next,
ifend

find Wdrop
not iftrue
  <code Wdrop     \ re-align stack to long boundry
    dropw, next,
ifend

\  New calls to the PrintCalls Code segment
\

find PrintCalls not
iftrue
  decimal -308 iovector PrintCalls  ( call lib20 )
ifend

find PrintCall not
iftrue
: PrintCall  ( selector -- )   \ Print call defining word
    create , does> @ PrintCalls  ;
ifend

: PrintCallFunc ( THprinthandle -- Result )  \ for high level traps
    create ,
    does> 0 2 bury        \ space for result
      @ PrintCalls   ;

: PrintCallFuncBool ( THprinthandle -- flag )  \ for high level traps
    create ,
    does> 0 2 bury          \ space for result
      @ PrintCalls  boolean  ;  \ set/clear result

hex
: PrError ( -- n )  \ print manager error code
  0 BA000000 PrintCalls slideresult ;

: PrSetError ( n -- )
  10 ( 16 decimal ) scale C0000200  PrintCalls wdrop ;

70070480  PrintCall PrGeneral   ( DataPtr -- )

    Structure TGnlData
      Short:  +iOpCode    ( input)
```

```
        Short:  +iError      ( output)
       Long: +reserved    ( RFFU)
       Long:   +hPrint
     Long:   +ResPoint
     Structure.End

decimal


   GLOBAL  PRec#       \ may want 0 if you draft print a lot on IW
   0 TO PREC#

 128 wConstant iPrAbort        \ user abort id number
   0 wConstant Draft       \ Draft Printing Mode - set in bjDocLoop
   1 wConstant Spool       \ Spool Printing Mode - set in bjDocLoop
3000 wConstant CancelDialog#  \ the supplied cancel print dialog ID#

global CanDlgID       0 -> CanDlgID
global CanDlgToken    0 -> CanDlgToken
global CanDlgInit     0 -> CanDlgInit
global pvt.stack    0 -> pvt.stack
global windowChanged?   0 -> windowChanged?

Create Print.Mode -1 ,   \ 0=Draft, 1=Spool, 2&3=User modes
Create Pr.Ref#    0 ,    \ Printer Resource File#

global oldWindow
global oldEvents
global oldOutfile

1 auto.key scale  1 activate.event scale  or     \ to mask off auto
  -1 xor  constant  -auto-activates      \      and activate events

hex
  0A60 wConstant _ResErr     \ 16-bit Resource error code
  E000 wConstant "E000     \ Printer name is stored in this resource
decimal

newTask userAbortProc

global CancelDialogPtr  0 -> CancelDialogPtr
global hPrint      \ current print-record handle storage
global pState    0 -> pState
  \  0= Not printing, 1= Driver open, 2= Document open, 3= Page open


create tPrStatus.buf  26 allot

variable terminatePrinting.token
  ( executed just before aborting with ?PrError message )

: terminatePrinting
  terminatePrinting.token @Execute ;

: save.current.window
  get.window      -> oldWindow
  events @      -> oldEvents
  events @  -auto-activates and  events !
  outfile @     -> oldOutfile
  outfile on ;

: restore.window
  windowChanged?
  if  oldWindow   (window)
```

```
    oldOutfile   outfile !
    oldEvents   events !
    flush.events
    discard.activates
    false -> windowChanged?
  then ;


  ( NOTE: the following code is from file "Filter Procedures" )
hex
\ 0A7C constant FilterRP   \ ApplScratch - 4

<code end-filter
    2678,0A7C , 2F2B,003C , 4CD3,7FFF , 4E75 w,

<code do.pIdle      \ filter procedure interface for pIdleProc
    2F0B,2678 , 0A7C,48D3 , 7FFF,205F , 2748,002C ,
  275F,003C , 2A78,0904 , 2055,49E8 , FC00,2C6C ,
  FFF4,7EC0 , 45FA,0004 , 4ED6 w,
  ] CanDlgToken execute  end-filter [
decimal

( *** assembly source code ***

0904 constant CurrentA5

code do.pIdle
    RP push,                        \ save original RP
    FilterRP @#W RP long movea,     \ Get filter RP
    RP () to 7FFF long movem,       \ save all registers except A7
    A0 pop,                         \ get original A3
    A0 2C RP i) long move,          \ fix A3 value in list
  sp )+ 3C RP i) long move,       \ save return address
  CurrentA5 @#W  A5 long move,    \ correct A5
    A5 ()  A0  long move,           \ globals pointer
    ' Parent <W@ A0 I)  A4 long lea,    \ PARENT's A4
    -0C A4 i) A6 long movea,        \ task's A6
    0 D7 moveq,                     \ no local frame
  >Forth
    --- forth stuff ---
\ code in "end-filter" follows
    FilterRP @#W  RP  long movea,   \ restore RP
    3C RP i)  sp -)  long move,     \ restore return address
    RP () from 7FFF  long movem,    \ restore caller's registers
    rts,                            \ return to caller
*** )


: install.pIdleProc
  ' do.pIdle 4-  hPrint @ 70 - ! ;

: clear.pIdleProc
  0 hPrint @ 70 + ! ;

: install.task
  0 userAbortProc activate<
    begin
      CanDlgToken execute
      1Second 15 / delay
    again
  stop> ;

: remove.task
  userAbortProc KillTask ;
```

```
: showCancelDialog
  CanDlgID center.dialog
  CanDlgID begin.dialog
  dup -> CancelDialogPtr
  draw.dialog ;

: hideCancelDialog
  CancelDialogPtr ?dup
  if  end.dialog
    discard.activates
    0 -> CancelDialogPtr
  then ;

: SetCancelDialog  ( ID#\run.token\init.token -- )
  ( see documentation )
  -> CanDlgInit
  -> CanDlgToken
  -> CanDlgID ;

: releasePvtStack
  pvt.stack ?dup
    if to.heap 0 -> pvt.stack then ;

variable theType
variable theHdl
create   theRect 8 allot

create evt.rec 16 allot

: ?Cmd-Period  ( -- flg )
  0 locals| result |
  begin
    evt.rec 8 @event            \ key.down mask
  while
    evt.rec 5+ c@ ascii . =         \ ? "."
    evt.rec 14 + w@  1 8 scale and  and  \ ? cmd key
      if  true -> result
      then
  repeat
  result ;

: resetDlgText
  CancelDialogPtr 1 theType theHdl theRect  get.d.item
  theHdl @ " Aborting Printing..." set.i.text ;

: dflt.pIdleProc
  ?Cmd-Period
  if  iPrAbort PrSetError
    resetDlgText
    3 sysbeep
  then ;


: stopCanDlg
  remove.task
  hideCancelDialog
  releasePvtStack ;

: prt.shutdown
  terminatePrinting
  stopCanDlg
  restore.window
  0 hilite.menu ;
```

```
: (startCanDlg)
  2048 from.heap dup -> pvt.stack
  if
    pvt.stack lock.handle
    pvt.stack @ 2048 + 64 - FilterRP !
    showCancelDialog
    CanDlgInit execute
    install.pIdleProc
    install.task
  else
    107 PrSetError
  then ;

: startCanDlg
  CanDlgToken
  if   (startCanDlg)
  else CanDlgID
     if   CancelDialog# -> CanDlgID
        token.for dflt.pIdleProc -> CanDlgToken
        (startCanDlg)
     else clear.pIdleProc
        remove.task
     then
  then ;


hex
  C8000000     PrintCall PrOpen       ( -- Open Print Manager)
               \ **** Use PrError to detect an open failure

  D0000000     PrintCall PrClose      ( -- Close Print Manager)

  20040480     PrintCall PrintDefault  ( hPrint --  )
               \ fills the print record with current defaults

  52040498     PrintCallFuncBool PrValidate    ( hPrint -- Boolean )
                   \ false = valid print record)


  2A040484  PrintCallFuncBool _PrStlDialog  ( hPrint -- Boolean )

: PrStyleDialog ( hPrint -- Boolean ; style dialog, true if OK button)
    get.cursor locals| theCursor
    init.cursor
     _PrStlDialog
    theCursor set.cursor
    discard.activates ;


   32040488  PrintCallFuncBool _PrJobDialog  ( hPrint -- Boolean )

: PrJobDialog ( hPrint -- Boolean   job dialog, true if OK button)
    get.cursor locals| theCursor
    init.cursor
    _PrJobDialog
    theCursor set.cursor
    discard.activates ;


   5804089C     PrintCall PrJobMerge ( hPrintSrc\hPrintDst --)
               \ Merges print records. Use this if the print
               \ command is selected from the Finder.
```

```
: PrOpenDoc ( hPrint\pPrPort\pIOBuf -- pPrPort )
  0 3 BURY  04000C00  PrintCalls ;

( hPrint is the print record handle.  pIOBuf is normally 0.  pPrPort will
become the currently active port.  If you pass 0 for pPrPort, PrOpenDoc
will allocate a port for you from the heap.  The MacForth drawing commands
will barf on this wptr though, so I suggest you pass your own storage for
pPrPort, created with New.Window.  )


  10000808  PrintCall PrOpenPage   ( pPrPort\pPageFrame -- )
             \ begin a new page. Spooled printing will be scaled
             \ if you pass a pPageFrame.  Normally this is nil.


  1800040C  PrintCall PrClosePage ( pPrPort -- )
             \ finish the current page

  08000484  PrintCall PrCloseDoc ( pPrPort -- )
             \ finish the current document

  60051480    PrintCall PrPicFile
             ( hPrint\pPrPort\pIoBuf\pDevBuf\var prStatus -- )
             \ prints a spooled file.  Do not pass a pPrPort that
             \ was allocated foryou by PrOpenDoc.  If you defined
             \ one yourself with NEW.WINDOW, it is ok. Normally
             \ pass 0 for pIOBuf and pDevBuf.  prStatus is a
             \ record that holds printing progress information.
             \ See Printing Structures file for details.


: PrDlgMain ( THPrint\pDlgInitProcPtr -- Boolean)
  0 3 bury  4A040894  PrintCalls boolean  ;

\ PrintRecord Functions
  A8000000    PrintCall PrPurge      \ Mark PrintRecord Purgable
  B000000C    PrintCall PrNoPurge    \ Mark PrintRecord UnPurgable

decimal


: load.print.rec   ( ID --; Loads & Locks Print rec)
  ascii PREC swap get.resource -> hPrint
  hPrint ?dup
  if   non.purgable
  else _ResErr <W@  io-result ! file.error
  then ;

(
  Id: 0=default, 1=last used record
  Note: You must have opened Printer resource already
 )


: (Despool?)   ( -- )
  pause
  Print.Mode @ Spool =
  if   hPrint 0 0 0 tPrStatus.buf  PrPicFile then ;


: Style.Dialog   (  -- flag - True if ok, False on Cancel)
  hPrint PrStyleDialog discard.activates ;
```

```
: Job.Dialog  ( -- flag , True if ok, False on Cancel)
  hPrint PrJobDialog discard.activates ;


-1 0 0 SetCancelDialog   \ initialize to use default Cancel Dialog

global print.token
0 to print.token

hex

: handle.print.error
  error.flag 0= not
  error.flag iPrAbort = not and if
    do.error.alert
  then ;

decimal

: Load.Print.Record
  PrOpen
  PrError 0=  if
    0 to hPrint
    ascii PREC PREC# get.resource to hPrint

    hPrint handle.size 1 > if
      hPrint Detach.Resource
    else
      -108 to error.flag
    then
  then
  PrClose  ;


: Release.Print.Record
  hPrint handle.size 1 > if
    hPrint To.Heap
    0 to hPrint
    then  ;


: Do.Page.Setup ( --; run the Page Setup dialog )
  PrOpen
  PrError 0=  if
    hPrint PrValidate drop
    Style.Dialog Drop       \ run the style dialog, ignore the result
  else
    PrError to error.flag
  then
  PrClose
  handle.print.error ;


: Print.with.dialog    ( -- )
  get.window 0 0 locals| TempPRPort prtMode the.window
    userAbortProc dup addTask stopTask
    PrOpen
    PrError 0=  if
      Job.Dialog if
        startCanDlg
        hPrint PrValidate drop
        PrError 0=  if
```

```
        hPrint @ 68 + c@  to prtMode
        prtmode print.mode !            \ save for (despool)  GLG 020187
        hPrint 0 0 PrOpenDoc to TempPRPort
          PrError 0= if
          TempPRPort 0 PrOpenPage
          PrError 0= if
            Print.Token execute
          then
          TempPRPort PrClosePage
        then
        TempPRPort PrCloseDoc
        (Despool?)
      then
      stopCanDlg
    then
  then
  PrError to error.flag
  PrClose
  the.window ?active.wptr if
    the.window (window)
  then
  handle.print.error  ;


: Print.without.dialog    ( -- )
  get.window 0 0 locals  TempPRPort prtMode the.window
    userAbortProc dup addTask stopTask
    PrOpen
    PrError 0=  if
      startCanDlg
      hPrint PrValidate drop
      PrError 0=  if
        hPrint @ 68 + c@  to prtMode
        prtmode print.mode !            \ save for (despool)  GLG 020187
        hPrint 0 0 PrOpenDoc to TempPRPort
          PrError 0= if
          TempPRPort 0 PrOpenPage
          PrError 0= if
            Print.Token execute
          then
          TempPRPort PrClosePage
        then
        TempPRPort PrCloseDoc
        (Despool?)
      then
      stopCanDlg
    then
    PrError to error.flag
    PrClose
    the.window ?active.wptr if
      the.window (window)
    then
    handle.print.error  ;
```

```
CR ." Loading shadow utils... "

ANEW NEW.C.SHADOW.4

VARIABLE SHADE.RECT 8 ALLOT
CREATE MAP.OFFSET 0 ,
CREATE MAP.FRACT 0 , 0 ,
GLOBAL EXIT.FLAG
0 TO EXIT.FLAG
CREATE PROJECT.INCREMENT.MASK 0 ,  0 ,

 NEW.WINDOW  C.TEMPORT
 CREATE CURRENT.TEMP.PORT 0 ,
 CREATE ^TEMP.BITS 0 ,

 : OPEN.TEMP.CPORT                      \ window -- opens as background color port
   0 GET.WINDOW
   0 0 LOCALS| the.map the.clut LAST.WIN THE.CBITS THE.WIN     \ define locals
 THE.WIN  OPENCPORT                     \ open the color port
 THE.WIN  ^PIX.MAP.OF  TO THE.CBITS             \ cbits = ^Pix.map
 DFLTQDPROCS THE.WIN  104 + !               \ set the default graphic procedures
 BACK.GDEVICE @ @ +GDPMAP @  TO THE.MAP            \ find the gdevice pixmap
 THE.MAP @ +PMTABLE @ TO THE.CLUT
 THE.CLUT THE.CBITS @ CTabHandle !              \ Set the clut to the backGDevice
 0 0 ZBUFFERY @ ZBUFFERX @
 THE.CBITS @ UPBOUNDS !RECT                 \ set the bounds of the pixmap
 8 THE.CBITS @ PIXELSIZE W!                 \ set the pixel size
 8 THE.CBITS @ CMPSIZE W!
 zbufferx @ 7+ 8/ 8*
 DUP ROW.BIT +
 THE.CBITS @ ROWBYTES W!                   \ store in the pixmap
 zbuffery @ *                         \ calc size of memory block
 HEAP.VARIABLE                          \ locked block handle , ptr
 THE.CBITS @ BASEADDR !                     \ store pointer in pixmap
   ^TEMP.BITS !                       \ store handle in poly global
 LAST.WIN ?ACTIVE.WPTR IF                   \ reset window if active
 LAST.WIN (WINDOW)  THEN   ;


 : OPEN.TEMP.BITS
   ^TEMP.BITS @  0 = NOT  IF
     ^TEMP.BITS @ UNLOCK.HANDLE
     ^TEMP.BITS @ TO.HEAP
     0 ^TEMP.BITS !
   THEN
   CURRENT.TEMP.PORT @ 0 = NOT IF
     CURRENT.TEMP.PORT @ CLOSE.PORT
   THEN
     enter.current.backport
       C.TEMPORT OPEN.TEMP.CPORT
     exit.current.backport
     C.TEMPORT CURRENT.TEMP.PORT !
   ^TEMP.BITS @ 0 =  IF
     -108 TO ERROR.FLAG
     DO.ERROR.ALERT
   THEN
   ^TEMP.BITS @ @ MASK.HANDLE
   ^POLY.BITS @ @ MASK.HANDLE -
```

```
MAP.OFFSET ! ;

: CLOSE.TEMP.BITS
  CURRENT.TEMP.PORT @ CLOSE.PORT
  0 CURRENT.TEMP.PORT !
   ^TEMP.BITS @  0 = NOT  IF
   ^TEMP.BITS @ UNLOCK.HANDLE
   ^TEMP.BITS @ TO.HEAP
    0 ^TEMP.BITS !
 THEN
  0 ^TEMP.BITS !
  0 MAP.OFFSET !  ;


( CHECK.PIX )                                  ( 110786 YH )


CODE GET.8.DOT  ( X, Y )  assembler   \ writes dot to poly screen
   SAVE.REGS
 MAP.OFFSET A0 )#MOVE,
 A0 () D4 LONG MOVE,
 D0 GET,                    \ fetch y
   2 SP@, D0 LONG OR,            \ or with x
   D0 SCAN.RECORD#  -1 *  WORD ANDI, EQ IF,        \ if within index
      ^SCAN.ARRAY  A1 )#MOVE,        \ a0 is scan array
  A1 () A0 LONG MOVE,
  SCAN.INDEX  A1 )#MOVE,         \ a1 is scan index
    D0 POP, D1 POP,
  D0 2 # WORD ASL,             \ y * 2
  D0 0 WORD A1 @I) D3 LONG MOVE,     \ fetch index to array
    D3 0 LONG A0 @I) A2 LONG MOVE,     \ a2 = start yscan address
  D4 A2 LONG ADDA,           \ add map offset
      D1 2 # WORD ASL,           \ x * 2
  D1 0 WORD A1 @I) D3 LONG MOVE,     \ fetch x index to array
    D3 X.BYTE LONG A0 @I) D0 WORD MOVE, \ d0 = xbyte
      D0 0 WORD A2 @I) D2 BYTE MOVE,     \ SET the bit
  D2 WORD EXT,
  D2 LONG EXT,
  ELSE,    SP 8 LONG ADDQ,
      0 D2 MOVEQ, THEN,        \ else clear stack
  D2 PUSH,
RESTORE.REGS NEXT END-CODE


CODE COLOR.8.DOT
SAVE.REGS
 D0 GET,                      \ fetch y
   2 SP@, D0 LONG OR,               \ or with x
   D0 SCAN.RECORD#  -1 *  WORD ANDI, EQ IF,      \ if within index
  PROJECT.INCREMENT.MASK A0 )#MOVE,
  A0 () D6 LONG MOVE,
  4 A0 I) D5 LONG MOVE,               \ fetch the masks
      ^SCAN.ARRAY  A1 )#MOVE,            \ a0 is scan array
  A1 () A0 LONG MOVE,
  SCAN.INDEX  A1 )#MOVE,              \ a1 is scan index
    D0 POP, D1 POP, D4 POP,            \ d4 is the color
  D0 2 # WORD ASL,              \ y * 2
  D0 0 WORD A1 @I) D3 LONG MOVE,         \ fetch index to array
    D3 0 LONG A0 @I) A2 LONG MOVE,         \ a2 = start yscan address
  D1 2 # WORD ASL,              \ x * 2
```

```
  D1 0 WORD A1 @I) D3 LONG MOVE,          \ fetch x index to array
  0 D0 MOVEQ,
    D3 X.BYTE LONG A0 @I) D0 WORD MOVE,       \ d0 = xbyte
  D0 A2 LONG ADDA,
  0 D0 MOVEQ,
  A2 () D0 BYTE MOVE,
  D4 D2 WORD MOVE,
  D5 D4 WORD AND,                \ d4 is color index
  D6 D0 WORD AND,                \ find the source color index
  D6 D2 WORD AND,                \ find the base color index
  D0 D2 WORD ADD,
  D2 2 WORD ADDQ,
  D2 D5 WORD AND, NE IF,
    D6 D2 WORD MOVE,
  THEN,
  D2 1 WORD SUBQ,
  D2 D4 WORD OR,
  D4  A2 () BYTE MOVE,             \ set the byte
ELSE,   SP 8 LONG ADDQ,
THEN,                          \ else clear stack
RESTORE.REGS
NEXT END-CODE


(  >OFFSET, OFFSET>, )                              ( 110786 YH )

: >OFFSET, ASSEMBLER
  YOFFSET OLIT, A0 POPOFF, A0 () D0 LONG MOVE, D0 LONG NEG,
  D0 4 SP I)  LONG ADD,
  XOFFSET OLIT, A0 POPOFF, A0 () D0 LONG MOVE, D0 LONG NEG,
  D0 8 SP I) LONG ADD, ;

: OFFSET>, ASSEMBLER
  YOFFSET OLIT, A0 POPOFF, A0 () D0 LONG MOVE,
  D0  4 SP I)  LONG ADD,
  XOFFSET OLIT, A0 POPOFF, A0 () D0 LONG MOVE,
  D0 8 SP I)  LONG ADD, ;

: IN.RANGE   0 MAX ZBUFFERY @ MIN SWAP 0 MAX ZBUFFERX @ MIN SWAP ;

 CODE IN.RANGE?
  D0 POP, D1 POP,
  0 LIT,
  D0 LONG TST, PL IF,
    D1 LONG TST, PL IF,
      ZBUFFERY a0 )#move,
      a0 () d0 long cmp, mi if,
        ZBUFFERX a0 )#move,
        a0 () d1 long cmp, mi if,
          DROP,
          -1 LIT,
        THEN,
      THEN,
    THEN,
  THEN,
 NEXT END-CODE


: SCALE.UP, ASSEMBLER            \ x y z -- scale by 16 *
   D0 POP, D1 POP, D2 POP,
   4 D3 MOVEQ,
   D0 D3 LONG ASL,
   D1 D3 LONG ASL,
   D2 D3 LONG ASL,
```

```
MAP.FRACT AO )#MOVE,
AO () D1 LONG ADD,
4 AO I) D2 LONG ADD,
D2 PUSH, D1 PUSH, DO PUSH, ;

: SCALE.DOWN, ASSEMBLER          \ x y z -- scale by 16 /
DO POP, D1 POP, D2 POP,
4 D3 MOVEQ,
DO D3 LONG ASR,
D1 D3 LONG ASR,
D2 D3 LONG ASR,
D2 PUSH, D1 PUSH, DO PUSH, ;

( TRANSLATE )                                   ( 110886 YH )

CODE TRANSLATE
    SAVE.REGS
    >OFFSET,
>UN.PROJECT,
SCALE.UP,
    (UN.SWIVEL),
    SCALE.DOWN,
OFFSET>,
    RESTORE.REGS
    NEXT END-CODE

                                                ( 110686 YH )
VARIABLE LIGHT.YAW
VARIABLE LIGHT.PITCH VARIABLE LIGHT.ROL
VARIABLE SAVE.LIGHT 12 ALLOT
VARIABLE LIGHT.COS COS.LENGTH ALLOT

: SET.LIGHT.COS
 LIGHT.VECTOR TO.STACK
   SAVE.LIGHT FROM.STACK
   SET.LCOS
 COSINES COS.LENGTH COS.PLUCK
 ANGLE LIGHT.YAW :
   ANGLE LIGHT.PITCH :
 ANGLE LIGHT.ROL :
   LIGHT.YAW    @  YAW
   LIGHT.PITCH @  PITCH
   LIGHT.ROL    @  ROL
   COSINES LIGHT.COS COS.LENGTH CMOVE ;

                                                ( 110886 YH )

: INVERSE.COS  -1 * >R >R -1 * >R >R -1 *
   R> R> R> R>  ;

: IMPREMATURA  BLACK PENPAT  8 PENMODE
   512 0 DO   I 0 (MOVE.TO) I 330 (LINE.TO)  2 +LOOP ;

 : BUFFER.IMAGE  GET.WINDOW  2 +  BACK.BITS @
    GET.WINDOW 16 +  GET.WINDOW 16 +  0 0   COPY.BITS  ;
```

```
: BACK.BLACK  GET.WINDOW CURRENT.BACKPORT @ WINDOW
  0 0 512 512 BLACK PATTERN RECTANGLE  WINDOW ;

                                              ( 110786 YH )


: DRAW.SCRAP                          \ draw scrap
  0 LOCALS| PICT.HANDLE                     \ define locals
0 TO ERROR.FLAG
0 0 ZBUFFERX @ ZBUFFERY @
WHITE PATTERN RECTANGLE
0 ?HEAP.SIZE
MINHEAPSIZE
SCRAP.HANDLE @ HANDLE.SIZE 0 MIN -
> IF                        \ if there is some room in the heap..
  0 FROM.HEAP TO PICT.HANDLE            \ get a handle
  PICT.HANDLE 0= NOT IF               \ if handle is good...
    PICT.HANDLE "PICT GET.SCRAP         \ fetch the scrap
    TO ERROR.FLAG
    ERROR.FLAG NO.ERROR >
    PICT.HANDLE HANDLE.SIZE 0 > AND IF       \ if no scrap errors
      0 TO ERROR.FLAG
      PICT.HANDLE DUP @ 2-
      DRAW.PICTURE                  \ draw the pictures in nil rect
          PICT.HANDLE HANDLE.SIZE -1 > IF
        PICT.HANDLE DISPOSE.PICTURE
      THEN                    \ return the handle
    THEN
    PICT.HANDLE HANDLE.SIZE -1 > IF
      PICT.HANDLE TO.HEAP
    THEN
  ELSE
    -108 TO ERROR.FLAG                \ POST ERROR IF HANDLE IS NIL
  THEN
ELSE
    -108 TO ERROR.FLAG                \ POST ERROR IF HANDLE IS NIL
THEN  ;


:  DRAW.BACK.SCRAP
     ENTER.CURRENT.BACKPORT
     CURRENT.TEMP.PORT @ (WINDOW)
       DRAW.SCRAP
   EXIT.CURRENT.BACKPORT
   DO.ERROR.ALERT ;


 : BACK.PATTERN >R  GET.WINDOW CURRENT.BACKPORT @ WINDOW
    0 0 512 512 R> PATTERN RECTANGLE  WINDOW ;


                                              ( 120186 YH )
   CODE N.TRANSLATE
        SAVE.REGS
       >OFFSET,
   >UN.PROJECT,
   SCALE.UP,
       (UN.SWIVEL),
       SCALE.DOWN,
   OFFSET>,
       RESTORE.REGS
```

```
NEXT END-CODE

10 CONSTANT SHADOW.ERROR


: SHADEDOT, ( X, Y ) assembler        \ writes dot to poly screen
 SAVE.REGS
 DO GET,                   \ fetch y
   2 SP@, DO LONG OR,              \ or with x
   DO SCAN.RECORD# -1 * WORD ANDI, EQ IF,   \ if within index
  ^SCAN.ARRAY  A1 )#MOVE,          \ a0 is scan array
  A1 () A0 LONG MOVE,
  SCAN.INDEX  A1 )#MOVE,           \ a1 is scan index
    DO POP, D1 POP,
  DO 2 # WORD ASL,            \ y * 2
  DO 0 WORD A1 @I) D3 LONG MOVE,       \ fetch index to array
    D3 0 LONG A0 @I) A2 LONG MOVE,       \ a2 = start yscan address
      D1 2 # WORD ASL,             \ x * 2
  D1 0 WORD A1 @I) D3 LONG MOVE,       \ fetch x index to array
    D3 X.BYTE LONG A0 @I) D0 WORD MOVE,   \ d0 = xbyte
  SHADE.INDEX A0 )#MOVE,
  0 D2 MOVEQ,
      DO 0 WORD A2 @I) D2 BYTE MOVE,       \ fetch index
  D2 0 WORD A0 @I) D3 BYTE MOVE,
  D3 DO 0 WORD A2 @I) BYTE MOVE,       \ store.shade
   ELSE,
  SP 8 LONG ADDQ,
 THEN,                     \ else clear stack
 RESTORE.REGS  ;


: Z.UNSCALE,  ASSEMBLER
  ZBUFF.SCALE  A0 )#MOVE,
  A0 () D1 LONG MOVE,
 D0 LONG EXT,
  D1 LONG TST, PL IF,
    D0 D1 LONG ASL,
  ELSE,
  D1 LONG NEG,
  D0 D1 LONG ASR,
 THEN, ;


CODE N.SHADE.PIXEL              \ x, y are on stack
  SAVE.REGS
  2DUP,                    \ x, y, x, y are on stack
  ZBUFFER A0 )#MOVE,
  A0 () D0 LONG MOVE,
  THE.BUFFER A0 )#MOVE,
  D0 A0 () LONG MOVE,             \ zbuffer the.buffer !
  D5 GET,
  4 SP I) D6 LONG MOVE,
    SET.XY>ZBUFF,               \ get the buffer address in A0
      0 D0 MOVEQ,
      A0 () D0 Z.SIZE, MOVE,          \ d0 is the z at that location
      D0 Z.EXT,              \ extend the z value
  D0 ZERASE WORD CMPI, NE IF.L,        \ if not the background...
    Z.UNSCALE,               \ unscale the z for transformation
    D0 1 LONG ADDQ,            \ add one for roundoff
    D0 PUSH,
    >OFFSET,                \ offset the vector
```

```
    >UN.PROJECT,               \ un-project the vector
    SCALE.UP,                  \ scale-up the vector
        (UN.SWIVEL),
        SCALE.DOWN,
    OFFSET>,
    D7 POP,                  \ d7 is z
    D0 GET, 4 SP I) D1 LONG MOVE,
    0 LIT,
    D0 1 LONG SUBQ,
    D1 1 LONG SUBQ,
    D0 LONG TST, PL IF,
      D1 LONG TST, PL IF,
        D0 2 LONG ADDQ,
        D1 3 LONG ADDQ,
        ZBUFFERY a0 )#move,
        a0 () d0 long cmp, mi if,
          ZBUFFERX a0 )#move,
          a0 () d1 long cmp, mi if,
            DROP,
            -1 LIT,
          THEN,
        THEN,
      THEN,
    THEN,
    D0 POP,
    D0 LONG TST, NE IF.L,
      OBUFFER A0 )#MOVE,
      A0 () D0 LONG MOVE,
      THE.BUFFER A0 )#MOVE,
      D0 A0 () LONG MOVE,        \ obuffer the.buffer !
      D5 POP,
      D6 POP,
      SET.XY>ZBUFF,
          0 D0 MOVEQ,
          A0 () D0 Z.SIZE, MOVE,
          D0 Z.EXT,            \ THE.BUFF@
      Z.UNSCALE,
      ' SHADOW.ERROR A0 )#MOVE,
      A0 () D0 LONG ADD,
          D7 D0 WORD SUB, MI IF,
        SHADEDOT,
      ELSE,
        2DROP,
      THEN,
    ELSE,
      2DROP, SHADEDOT,
    THEN,
  ELSE,
    2DROP, 2DROP,
  THEN,
  RESTORE.REGS
  NEXT END-CODE


CODE EVEN
   D0 POP, D0 0 # BCLR, D0 PUSH, NEXT END-CODE

CODE ODD
   D0 POP, D0 0 # BSET, D0 PUSH, NEXT END-CODE


:  DRAW.SHADOW
  0 TO EXIT.FLAG
```

```
SET.WATCH.CURSOR
  SHADE.RECT @RECT POLY.CLIP SHADE.RECT !RECT
       SHADE.RECT 6 - W@      SHADE.RECT 2 - W@    DO
    EXIT.FLAG NOT IF
       SHADE.RECT 4 + W@    SHADE.RECT W@      DO
        I J  N.SHADE.PIXEL
       LOOP
   I 30 AND 0= IF
    SET.WATCH.CURSOR
    GET.WINDOW
      WORLD.OUTPUT WINDOW
      DISPLAY.WORLD
        WINDOW
   THEN
    ?CMD-PERIOD IF
      10 SYSBEEP
      -1 TO EXIT.FLAG
    THEN
   THEN
    LOOP
   INIT.CURSOR  ;



create YDOT 0 ,
create Xdot 0 ,


 : 8.PROJECT.PIXEL ( X Y -- OUTPUTS DOT )
    2DUP  YDOT !  XDOT !
    2DUP  THE.BUFF@
    DUP ZERASE = NOT IF
        Z.UNSCALE  1+
       N.TRANSLATE DROP
       IN.RANGE
       GET.8.DOT DUP IF
     XDOT @ YDOT @ COLOR.8.DOT
   ELSE DROP THEN
    ELSE
       DROP 2DROP
    THEN  ;


:  DRAW.PROJECT
   0 TO EXIT.FLAG
   SET.WATCH.CURSOR
   SHADE.RECT @RECT POLY.CLIP SHADE.RECT !RECT
   ZBUFFER @ THE.BUFFER !
     8 PENMODE
     BLACK PENPAT
       SHADE.RECT 6 - W@  SHADE.RECT 2 - W@  DO
     EXIT.FLAG NOT IF
         SHADE.RECT 4 - W@  SHADE.RECT W@    DO
          I J  8.PROJECT.PIXEL
         LOOP
     I 31 AND 0=  IF
      SET.WATCH.CURSOR
      GET.WINDOW
      WORLD.OUTPUT WINDOW
        DISPLAY.WORLD
          WINDOW
    THEN
```

```
    ?CMD-PERIOD IF
      10 SYSBEEP
      -1 TO EXIT.FLAG
    THEN
  THEN
    LOOP
  INIT.CURSOR  ;



 VARIABLE TEMP.WORLD.COS COS.LENGTH ALLOT
 VARIABLE TEMP.WORLD.3POS 12 ALLOT


\ draw. world.view


  : DRAW.WORLD.VIEW          \ draws world view
    ZBUFFER @ THE.BUFFER !        \ set zbuffer
    OCLEAR.ZBUFF           \ clear just zbuffer
    WORLD.OBJECT
  SET.CURRENT.OBJECT          \ set world as current
    OBJECT.ACOS           \ save world cosines
  TEMP.WORLD.COS SWAP MOVE.RECORD
  OBJECT.A3POS TEMP.WORLD.3POS SWAP MOVE.RECORD
    A.DRAW.WORLD  ;          \ draw the view


\ draw.light.view

  : SET.LIGHT'S.VIEWPOINT
    SET.LIGHT.COS               \ set light cosines
    SET.TEST.VEC                \ set the test vector
    WORLD.OBJECT SET.CURRENT.OBJECT        \ set world as current
    OBJECT.ACOS COSINES SWAP MOVE.RECORD    \ set cosines to world cosines
    TEST.SWIVEL                 \ swivel the test vec
    LIGHT.COS COSINES COS.LENGTH CMOVE      \ fetch light cosines
                       \ negative cosine, so no unswivel
    TEST.UN.SWIVEL               \ swivel the test vector
    WORLD.OBJECT SET.CURRENT.OBJECT        \ set world as current
    OBJECT.A3POS PLUCK              \ fetch world's position
    un.SWIVEL                   \ swivel the vector
    OBJECT.A3POS PLACE              \ place in the world's position
    GET.ATTITUDE                \ get the test vector's attitude
    T.VARS OBJECT.ACOS MOVE.RECORD        \ store the test cosines in the world
    OBJECT.A3POS PLUCK
    OBJECT.R3POS PLACE              \ set relative world = to absolute
    OBJECT.ACOS  PLUCK
    OBJECT.RCOS  PLACE  ;


  : DRAW.LIGHT.VIEW           \ draws world from light's view
  ORTHOGRAPHIC @ >R
  GLOBAL.RENDER @ >R
  RENDER.MODE @ >R
  ORTHOGRAPHIC ON
  -1 GLOBAL.RENDER !          \ set to global render
    SET.LIGHT'S.VIEWPOINT
  OBUFFER @ THE.BUFFER !        \ write to object buffer
    ZRender RENDER.MODE !      \ use alternate poly write ( no shading )
```

```
  CLEAR.WOBUFFER            \ clear object buffer for z values
  A.DRAW.WORLD              \ draw the world
  LIGHT.COS                \ fetch light cosines to global
  COSINES COS.LENGTH CMOVE      \ for transforming shadow and project
R> RENDER.MODE !
R> GLOBAL.RENDER !
R> ORTHOGRAPHIC ! ;

: RESTORE.WORLD.VARS
CURRENT.OBJECT @
LOCALS| THE.OBJECT  |
WORLD.OBJECT  SET.CURRENT.OBJECT
  SAVE.LIGHT TO.STACK
  LIGHT.VECTOR FROM.STACK
  WORLD.OBJECT SET.CURRENT.OBJECT
  TEMP.WORLD.COS OBJECT.ACOS MOVE.RECORD
TEMP.WORLD.3POS OBJECT.A3POS MOVE.RECORD
OBJECT.A3POS PLUCK
OBJECT.R3POS PLACE              \ set relative world = to absolute
OBJECT.ACOS  PLUCK
OBJECT.RCOS  PLACE
THE.OBJECT SET.CURRENT.OBJECT
ZBUFFER @ THE.BUFFER !  ;

: DRAW.WORLD.OBJECT.BUFFER
GLOBAL.RENDER @
RENDER.MODE @
CURRENT.OBJECT @
LOCALS| THE.OBJECT THE.RENDER THE.GLOB
-1 GLOBAL.RENDER !
ZBUFFER @ THE.BUFFER !
ZORender RENDER.MODE !
WORLD.OBJECT  SET.CURRENT.OBJECT
SETMATERIALSCHANGED
SET.ABSOLUTE.LIGHTS       \ check for lighting/world change
UpdateMaterials
  CLEAR.ZBUFF
  A.DRAW.WORLD
  BLACK PENPAT
THE.OBJECT SET.CURRENT.OBJECT
THE.RENDER RENDER.MODE !
THE.GLOB GLOBAL.RENDER !  ;

: (SHADE.1PIX)
   RENDER.MODE @
   CURRENT.OBJECT @
   LOCALS| THE.OBJECT THE.RENDER
   WORLD.OBJECT SET.CURRENT.OBJECT
   SET.TREE.BOUNDS
   BOUNDS.RECT SHADE.RECT 8 CMOVE
   OBJECT.ACOS TEMP.WORLD.COS SWAP MOVE.RECORD
   OBJECT.A3POS TEMP.WORLD.3POS SWAP MOVE.RECORD
     DRAW.LIGHT.VIEW
     DRAW.SHADOW
     GET.WINDOW >R
     WORLD.OUTPUT WINDOW
     DISPLAY.WORLD
     R> WINDOW
   RESTORE.WORLD.VARS
   THE.OBJECT SET.CURRENT.OBJECT
```

```
  THE.RENDER RENDER.MODE ! ;

: OPEN.MAP.SHADOW
  OPEN.TEMP.BITS
    ^TEMP.BITS @  0 = IF
  -108 TO ERROR.FLAG ELSE
   DRAW.BACK.SCRAP THEN  ;

: CLOSE.MAP.SHADOW
  CLOSE.TEMP.BITS ;

HEX

: SET.PROJECT.INCREMENT.MASK
  MONOCHROME? IF
    FF PROJECT.INCREMENT.MASK !
  ELSE
    Key.Color.Res @ 1- PROJECT.INCREMENT.MASK !
  THEN
  PROJECT.INCREMENT.MASK @ -1 XOR
  PROJECT.INCREMENT.MASK 4- !  ;

DECIMAL

: (MAP.SHADOW.PIX)
  ^TEMP.BITS @  0 = NOT
  ERROR.FLAG -1 > AND IF
    SET.PROJECT.INCREMENT.MASK
    WORLD.OBJECT SET.CURRENT.OBJECT
    SET.TREE.BOUNDS
    BOUNDS.RECT SHADE.RECT 8 CMOVE
    SET.LIGHT.COS
    LIGHT.COS  COSINES COS.LENGTH CMOVE
      DRAW.PROJECT
      GET.WINDOW >R
      WORLD.OUTPUT WINDOW
      DISPLAY.WORLD
      R> WINDOW
    SAVE.LIGHT TO.STACK
      LIGHT.VECTOR FROM.STACK
    GET.OBJECT
  THEN ;

: MAP.SHADOW.PIX
    OPEN.MAP.SHADOW
   (MAP.SHADOW.PIX)
   CLOSE.MAP.SHADOW  ;


CREATE SHADE.OFFSET 0 ,
CREATE SHADE.MASK  0 , -1 ,


CODE DO.MONO.SHADE.SCAN
 SAVE.REGS
  D0 GET,                    \ fetch y
   D0 -1024 WORD ANDI, EQ IF,        \ if within index
      ^SCAN.ARRAY  A1 )#MOVE,        \ a0 is scan array
   A1 () A0 LONG MOVE,
   SCAN.INDEX  A1 )#MOVE,          \ a1 is scan index
```

```
  D0 POP,                \ d0 is y
 D0 2 # WORD ASL,          \ y * 2
 D0 0 WORD A1 @I) D3 LONG MOVE,     \ fetch index to array
   D3 0 LONG A0 @I) A2 LONG MOVE,     \ a2 = start yscan address
 ZBUFFERX A0 )#MOVE,
 A0 () D7 LONG MOVE,
 SHADE.OFFSET A0 )#MOVE,
 A0 () D3 LONG MOVE,
 d7 3 long subq,
 BEGIN,
   0 D4 MOVEQ,
   D3 0 LONG A2 @I) D4 BYTE MOVE,     \ fetch the byte from the alias screen
   0 D2 MOVEQ,
   A2 () D2 BYTE MOVE,          \ get the byte from the back port
   255 # D4 WORD SUB,
   D4 WORD NEG,
   d4 d2 word sub, mi if,
     0 d2 moveq,
   then,
       D2 D3 0 LONG A2 @I) BYTE MOVE,     \ set the byte
   1 # A2 LONG ADDA,          \ increment the address
 D7 LOOP,
ELSE,   SP 4 LONG ADDQ,
     THEN,             \ else clear stack
RESTORE.REGS
NEXT END-CODE


CODE DO.KEY.SHADE.SCAN
XSAVE.REGS
D0 GET,                \ fetch y
   D0 -1024 WORD ANDI, EQ IF,      \ if within index
     ^SCAN.ARRAY  A1 )#MOVE,       \ a0 is scan array
  A1 () A0 LONG MOVE,
  SCAN.INDEX  A1 )#MOVE,        \ a1 is scan index
    D0 POP,              \ d0 is y
  D0 2 # WORD ASL,          \ y * 2
  D0 0 WORD A1 @I) D3 LONG MOVE,     \ fetch index to array
    D3 0 LONG A0 @I) A2 LONG MOVE,     \ a2 = start yscan address
  ZBUFFERX A0 )#MOVE,
  A0 () D7 LONG MOVE,
  SHADE.OFFSET A0 )#MOVE,
  A0 () D3 LONG MOVE,
  SHADE.mask A0 )#MOVE,
  A0 () D5 LONG MOVE,
  4 A0 I) D6 LONG MOVE,
  d7 3 long subq,
  BEGIN,
    0 D4 MOVEQ,
    D3 0 LONG A2 @I) D4 BYTE MOVE,     \ fetch the byte from the alias screen
    0 D2 MOVEQ,
    A2 () D2 BYTE MOVE,          \ get the byte from the back port
    D4 D0 LONG MOVE,
    D5 D4 WORD AND,
    D5 D2 WORD AND,
    D5 D4 WORD SUB,
    D4 WORD NEG,
    D4 D2 WORD SUB, MI IF,
      0 D2 MOVEQ,
    THEN,
    D6 D0 WORD AND,
    D2 D0 WORD OR,
        D0 D3 0 LONG A2 @I) BYTE MOVE,     \ set the byte
```

```
    1 # A2 LONG ADDA,            \ increment the address
  D7 LOOP,
ELSE,   SP 4 LONG ADDQ,
     THEN,                 \ else clear stack
XRESTORE.REGS
NEXT END-CODE

hex

: SET.SHADE.MASK
  100 Key.Color.Res @ / CASE
  1 OF  FF SHADE.MASK !    ENDOF
  2 OF  7F SHADE.MASK !    ENDOF
  4 OF  3F SHADE.MASK !    ENDOF
  8 OF  1F SHADE.MASK !    ENDOF
    10 OF  F SHADE.MASK !    ENDOF
  20 OF  7 SHADE.MASK !    ENDOF
  ENDCASE
  SHADE.MASK @ -1 XOR
  SHADE.MASK 4+ !  ;

decimal


: add.shade.ports
  ^TEMP.BITS @ @ MASK.HANDLE
  ^POLY.BITS @ @ MASK.HANDLE -
  SHADE.OFFSET !
  ERROR.FLAG 0= EXIT.FLAG 0= AND IF
    SET.WATCH.CURSOR
    MONOCHROME? IF
      ZBUFFERY @ 2-  0 DO
        I DO.Mono.SHADE.SCAN
      LOOP
    ELSE
      SET.SHADE.MASK
      ZBUFFERY @ 2-  0 DO
        I DO.KEY.SHADE.SCAN
      LOOP
    THEN
    INIT.CURSOR
  THEN ;


: back>temp
  SAVE.CLIP >R          \ save current clipping region
  0 0
  zbuffery @ zbufferx @
  temp.rect !rect
  TEMP.RECT CLIP.RECT      \ set new clipping rect
    BACK.BITS            \ fetch current background bitmap ( or pixmap )
  C.TEMPORT 2+ @ @
  TEMP.RECT DUP
   0 0            \ use temp rect for destination and source of blit
     COPY.BITS           \ do the blit
  R> RESTORE.CLIP       \ restore the old clipping region
   ;


: TEMP>BACK
  SAVE.CLIP >R          \ save current clipping region
  0 0
  zbuffery @ zbufferx @
  temp.rect !rect
```

```
 TEMP.RECT CLIP.RECT      \ set new clipping rect
 C.TEMPORT  2+ @ @
   BACK.BITS           \ fetch current background bitmap ( or pixmap )
 TEMP.RECT DUP
  0 0            \ use temp rect for destination and source of blit
     COPY.BITS           \ do the blit
 R> RESTORE.CLIP       \ restore the old clipping region
  ;

: TURN.OTHER.LIGHTS.OFF
  CURRENT.LIGHT @ LIGHT.RECORD /
  LOCALS| THIS.LIGHT |
  lights  TempLights Light.Record lights# * cmove
  LIGHTS# 0 DO
    I THIS.LIGHT  = NOT IF
      I SETCURRENTLIGHT
      0 LIGHTS CURRENT.LIGHT @ + +LIGHTTYPE !
    THEN
  LOOP
  THIS.LIGHT SETCURRENTLIGHT ;


: RESTORE.LIGHTS
  TempLights lights Light.Record lights# * cmove ;


: (SHADE.PIX)
  CURRENT.OBJECT @
  0 0 LOCALS| THE.REFLECT THE.FORM THE.OBJECT
  WORLD.OBJECT SET.CURRENT.OBJECT
  OBJECT.FORM PLUCK TO THE.FORM
  OBJECT.REFLECT PLUCK TO THE.REFLECT
  OPEN.TEMP.BITS
  ERROR.FLAG 0=
  EXIT.FLAG  0= AND IF
    0 SETCURRENTLIGHT
    TURN.OTHER.LIGHTS.OFF
    SETMATERIALSCHANGED
    REDRAW.OBJECT
    0 SETCURRENTLIGHT
    (SHADE.1PIX)
    RESTORE.LIGHTS
    back>temp
    WORLD.OBJECT SET.CURRENT.OBJECT
    NULL.FORM OBJECT.FORM PLACE
    0 OBJECT.REFLECT PLACE
    LIGHTS# 1 DO
      I SETCURRENTLIGHT
      Lights Current.Light @ + +LIGHTTYPE @ 0>
      EXIT.FLAG 0= AND IF
        TURN.OTHER.LIGHTS.OFF
        SETMATERIALSCHANGED
        REDRAW.OBJECT
        I SETCURRENTLIGHT
        Lights Current.Light @ + +LIGHTTYPE @ 1 = IF
          (SHADE.1PIX)
        then
        RESTORE.LIGHTS
        add.shade.ports
      THEN
    LOOP
    0 SETCURRENTLIGHT
    TEMP>BACK
    CLOSE.TEMP.BITS
```

```
  GET.WINDOW
    WORLD.OUTPUT WINDOW
    DISPLAY.WORLD
      WINDOW
ELSE
  DO.ERROR.ALERT
THEN
WORLD.OBJECT SET.CURRENT.OBJECT
THE.FORM OBJECT.FORM PLACE
THE.REFLECT OBJECT.REFLECT PLACE
THE.OBJECT SET.CURRENT.OBJECT ;


: SHADE.PIX
 (SHADE.PIX)
 DRAW.WORLD.OBJECT.BUFFER  ;
```

```
CR ." Loading Object Drawing Interface"

\ DRAW.OBJECT INTERFACE


\ scroll stuff

  : (SET.QUAD.SCROLL)                  \ sets the scroll from world object's position
    GET.WINDOW +HBAR @ 0 0 SET.CONTROL.RANGE
    GET.WINDOW +VBAR @ 0 0 SET.CONTROL.RANGE
    WORLD.OUTPUT SHOW.CONTROLS ;

  FIND (SET.QUAD.SCROLL)  CONSTANT QUAD.SCROLL.INIT
  NULL.TOKEN CONSTANT DO.QUAD.SCROLL

  : SET.QUAD.SCROLL
    QUAD.SCROLL.INIT EXECUTE  ;

  : DO.QUAD.CONTROLS
    DO.QUAD.SCROLL EXECUTE ;


  NULL.TOKEN CONSTANT POLY.DOUBLE.CLICK


: NULL.RECT?
  LOCALS| THE.RECT |
  THE.RECT @ 0=
  THE.RECT 4+ @ 0= AND  ;

 : SET.FULL.CLIP
  GET.WINDOW
    LOCALS|  C.WINDOW |
  0 0
  C.WINDOW PDOWNBOUNDS W@ scroll.width -
  C.WINDOW PRIGHTBOUNDS W@  scroll.width -
  TEMP.RECT !RECT  TEMP.RECT CLIP.RECT ;


: SET.LARGE.QUAD                    \ STRIP QUAD -- SETS AS FULL WINDOW
  GET.WINDOW
    LOCALS|  C.WINDOW C.QUAD C.STRIP
  -1 O.TOOL.WIDTH
  C.WINDOW PDOWNBOUNDS W@ scroll.width - 1-
  C.WINDOW PRIGHTBOUNDS W@  scroll.width - 1-
  O.TOOL.WIDTH MAX
  C.QUAD !RECT
  C.STRIP C.QUAD  SET.QUAD.STRIP
    C.QUAD  SET.RULER.STRIP
  C.QUAD SET.TRANSLATION.CENTER         \ set center offset
  C.QUAD WIRE.QUAD = NOT IF
      0 0 0 0 WIRE.QUAD !RECT
      0 0 0 0 WIRE.STRIP !RECT
  THEN
  C.QUAD CROSS.QUAD = NOT IF
      0 0 0 0 CROSS.QUAD !RECT
      0 0 0 0 CROSS.STRIP !RECT
  THEN
  C.QUAD SIDE.QUAD = NOT IF
      0 0 0 0 SIDE.QUAD !RECT
      0 0 0 0 SIDE.STRIP !RECT
  THEN
  C.QUAD TOP.QUAD = NOT IF
```

```
    0 0 0 0 TOP.QUAD !RECT
    0 0 0 0 TOP.STRIP !RECT
THEN ;


: DISPLAY.STRIP                    \ DISPLAYS STRIP PICTURE
  0 LOCALS| PICT.HANDLE C.PICT C.STRIP
  C.STRIP @RECT TEMP.STRIP !RECT
  ASCII PICT C.PICT   GET.RESOURCE TO PICT.HANDLE
  PICT.HANDLE IF
    PICT.HANDLE @ 2+ @RECT            \ same rect as O.tools
        ROT  -  TEMP.STRIP 2+ W@ EXT +
    TEMP.STRIP 6 + W!
        SWAP -  TEMP.STRIP W@ EXT +
    TEMP.STRIP 4 + W!
    SAVE.CLIP >R
    C.STRIP CLIP.RECT
        PICT.HANDLE TEMP.STRIP DRAW.PICTURE
    R> RESTORE.CLIP
  THEN ;


: FLASH.SELECT                     \ FLASHES STRIP
  LOCALS| C.STRIP |
  C.STRIP (INVERT.RECT)
    TICKCOUNT BEGIN DUP
    TICKCOUNT SWAP - 7 =
    UNTIL DROP
  C.STRIP (INVERT.RECT) ;


: TRACK.IN.RECT
  LOCALS| C.RECT C.POINT
  C.POINT C.RECT PTINRECT IF
    C.RECT (INVERT.RECT)
    BEGIN
      DO.EVENTS MOUSE.UP @ NOT WHILE
    REPEAT
    C.RECT (INVERT.RECT)
    @MOUSE.UP C.RECT PTINRECT
  ELSE 0 THEN ;


: TEST.QUAD
  LOCALS| C.QUAD C.POINT |
  C.POINT C.QUAD PTINRECT IF
    C.QUAD CURRENT.QUAD !
    -1 ELSE 0 THEN   ;


: CLEAR.CURRENT.QUAD
    CURRENT.QUAD @
    @RECT
    SWAP 2SWAP SWAP 2SWAP
    4DUP
    WHITE PATTERN RECTANGLE
    FRAME RECTANGLE ;


: REFRESH.WIRE.QUAD
  WIRE.QUAD NULL.RECT? NOT IF
    8 PENMODE
    WIRE.STRIP VIEW.PICT DISPLAY.STRIP
    SAVE.CLIP >R
```

```
    SET.FULL.CLIP
    WIRE.STRIP FRAME.RECT
    WIRE.QUAD FRAME.RECT
    WIRE.QUAD CLIP.RECT
    WIRE.QUAD CURRENT.QUAD !
    grid? @ >R
    0 grid? !
    GRID
    R> grid? !
    8 PENMODE
    SC @ >R
    SCALE.RANGE SC !
    QPOLY.FRAME
    R> SC !
    R> RESTORE.CLIP

  THEN ;

: REFRESH.CROSS.DRAWING
  CROSS.QUAD NULL.RECT? NOT IF
  SAVE.CLIP >R
  CROSS.QUAD CLIP.RECT
  10 PENMODE
  CROSS.QUAD CURRENT.QUAD !
  DRAW.SECTION
  R> RESTORE.CLIP
  8 PENMODE
  THEN ;

: REFRESH.CROSS.QUAD
  CROSS.QUAD NULL.RECT? NOT IF
  8 PENMODE
  CROSS.STRIP FRONT.PICT DISPLAY.STRIP
  SAVE.CLIP >R
  SET.FULL.CLIP
  CROSS.QUAD FRAME.RECT
  CROSS.STRIP FRAME.RECT
  CROSS.QUAD CLIP.RECT
  CROSS.QUAD CURRENT.QUAD !
  GRID
  10 PENMODE
  DRAW.SECTION
  R> RESTORE.CLIP
  8 PENMODE
  THEN ;

: REFRESH.SIDE.DRAWING
  SIDE.QUAD NULL.RECT? NOT IF
  SAVE.CLIP >R
  SIDE.QUAD CLIP.RECT
  SIDE.QUAD CURRENT.QUAD !
  10 PENMODE
  DRAW.SIDE
  DRAW.SIDE.NODE
  R> RESTORE.CLIP
  8 PENMODE
  THEN ;

: REFRESH.SIDE.QUAD
  SIDE.QUAD NULL.RECT? NOT IF
  8 PENMODE
  SIDE.STRIP SIDE.PICT DISPLAY.STRIP
  SAVE.CLIP >R
  SET.FULL.CLIP
```

```
SIDE.STRIP FRAME.RECT
SIDE.QUAD FRAME.RECT
SIDE.QUAD CLIP.RECT
SIDE.QUAD CURRENT.QUAD !
GRID
10 PENMODE
DRAW.SIDE
DRAW.SIDE.NODE
R> RESTORE.CLIP
8 PENMODE
THEN ;

: REFRESH.TOP.DRAWING
TOP.QUAD NULL.RECT? NOT IF
SAVE.CLIP >R
TOP.QUAD CLIP.RECT
TOP.QUAD CURRENT.QUAD !
10 PENMODE
DRAW.TOP
DRAW.TOP.NODE
R> RESTORE.CLIP
8 PENMODE
THEN ;

: REFRESH.TOP.QUAD
TOP.QUAD NULL.RECT? NOT IF
8 PENMODE
TOP.STRIP TOP.PICT DISPLAY.STRIP
SAVE.CLIP >R
SET.FULL.CLIP
TOP.QUAD FRAME.RECT
TOP.STRIP FRAME.RECT
TOP.QUAD CLIP.RECT
TOP.QUAD CURRENT.QUAD !
GRID
10 PENMODE
DRAW.TOP
DRAW.TOP.NODE
R> RESTORE.CLIP
8 PENMODE
THEN ;

: REFRESH.THE.QUAD
CURRENT.QUAD @
  CASE
    wire.QUAD OF REFRESH.wire.QUAD ENDOF
    CROSS.QUAD OF REFRESH.CROSS.QUAD ENDOF
    TOP.QUAD OF REFRESH.TOP.QUAD ENDOF
    SIDE.QUAD OF REFRESH.SIDE.QUAD ENDOF
  ENDCASE ;


NULL.TOKEN CONSTANT ^DISPLAY.QUADS

: DISPLAY.QUADS
    PAGE
    8 PENMODE
    SET.FULL.CLIP
    FULL.QUAD @ IF
      FULL.STRIP @ FULL.QUAD @ SET.LARGE.QUAD
    ELSE
      SET.QUAD.LIMITS
    THEN
    HILITE.C.TOOL
```

```
    REFRESH.WIRE.QUAD
    REFRESH.CROSS.QUAD
    REFRESH.SIDE.QUAD
    REFRESH.TOP.QUAD
    SET.QUAD.SCROLL ;

FIND  DISPLAY.QUADS  ' ^DISPLAY.QUADS !


  : TEST.QUADS
    DISPLAY.QUADS
    BEGIN
      DO.EVENTS
      CASE
        IN.SIZE.BOX OF
          DISPLAY.QUADS ENDOF
        ZOOM.BOX OF
          DISPLAY.QUADS ENDOF
        MOUSE.DOWN OF
          SET.CURRENT.QUAD
          CURRENT.QUAD @
          0 0 Q.MOVE.TO
          .
                  ENDOF
      ENDCASE
    AGAIN  ;


: DO.WIRE.QUAD
  SAVE.CLIP >R
  CURRENT.QUAD @ CLIP.RECT
  CURRENT.O.TOOL @
  CASE
    DOUBLE.ARROW  OF  ENDOF
    SINGLE.ARROW  OF  ENDOF
      O.POLY       OF ENDOF
    O.CIRCLE    OF ENDOF
      O.RECTANGLE   OF ENDOF
  ENDCASE
  FULL.QUAD @ NOT IF
    OBJECT.ACOS COSINES SWAP MOVE.RECORD
    REFRESH.WIRE.QUAD
  THEN
  R> RESTORE.CLIP ;


GLOBAL BETWEEN.LENGTH

  : between.points?
  LOCALS! TY TX Y1 X1 Y2 X2
  TY TX XY>POINT
  X1 X2 MIN 1 -
  Y1 Y2 MIN 1 -
  X1 X2 MAX 1+
  Y1 Y2 MAX 1+ TEMP.RECT !RECT
  TEMP.RECT PTINRECT IF
    Y1 Y2 - TO Y1
    X1 X2 - TO X1
    TY Y2 - TO TY
    TX X2 - TO TX
    X1 0 = IF 1 TO X1 THEN
    Y1 0 = IF 1 TO Y1 THEN
```

```
  Y1 TX X1 */ TY - ABS 4 <
  X1 TY Y1 */ TX - ABS 4 < OR IF
    Y1 ABS X1 ABS  > IF
      TY GRAPHIC.SCALE Y1 */
      TO BETWEEN.LENGTH
    ELSE
      TX GRAPHIC.SCALE X1 */
      TO BETWEEN.LENGTH
    THEN
    TRUE
  ELSE
    FALSE
  THEN
ELSE
  0
THEN ;


: BETWEEN.CCONTOUR           \ SETS THE PREV POINT CURRENT IF BETWEEN
  0 LOCALS| HIT.POINT |
 0 TO BETWEEN.LENGTH
   CCONTOUR @ 0 = NOT IF      \ IF ARRAY HAS ELEMENTS
   4 CURRENT.CPOINT !         \ 4 IS FIRST POINT AFTER INDEX
   CCONTOUR @ 4 DO
     THIS.CPOINT@
     CURRENT.QUAD @  >TRANSLATE
   INC.CURRENT.CPOINT         \ DRAW THE REST
     THIS.CPOINT@
     CURRENT.QUAD @  >TRANSLATE
     @MOUSE.DN POINT>XY
     BETWEEN.POINTS? IF
         I TO HIT.POINT
     THEN
   4 +LOOP
  THEN
  HIT.POINT IF
   HIT.POINT 4- CURRENT.CPOINT ! -1
  ELSE
   0
  THEN ;


: INSERT.CCONTOUR                \ sets the prev point current if between
    CURRENT.CPOINT @
  LOCALS| THE.POINT |
    CCONTOUR @ 0 = NOT
  CCONTOUR @ 4 / 2+ MAX.TYPE.POINTS < and IF     \ IF ARRAY HAS ELEMENTS
    CURRENT.CPOINT @ 4/ 1+
    MAX.TYPE.POINTS < IF
      Q.@MOUSE.DN
        CCONTOUR @ 8+ CURRENT.CPOINT @ DO
          THIS.CPOINT@
        2SWAP
        THIS.CPOINT!
        INC.CURRENT.CPOINT       \ DRAW THE REST
        4 +LOOP
      2DROP
      CCONTOUR @ 4+ CCONTOUR !
    THEN
  THEN ;

 : DELETE.CCONTOUR                \ sets the prev point current if between
    CURRENT.CPOINT @
  LOCALS| THE.POINT
```

```
CCONTOUR @ 12 > IF              \ IF ARRAY HAS more than 2 ELEMENTS
CCONTOUR @ 4+ CURRENT.CPOINT @ DO
  INC.CURRENT.CPOINT
    THIS.CPOINT@
  DEC.CURRENT.CPOINT
  THIS.CPOINT!
  INC.CURRENT.CPOINT
  4 +LOOP
CCONTOUR @ 4- CCONTOUR !
ELSE
  10 SYSBEEP
THEN ;

: DO.CCONTOUR.DELETE             \ deletes contour poly
OPTION.DOWN IF
   @MOUSE POINT>XY  ccheck.box      \ determine segment to edit
   cwhich.box? @ -1 = not if      \ if something was selected
   CURRENT.CPOINT @ >R
   REFRESH.CROSS.DRAWING
   R> CURRENT.CPOINT !
   MARK.LATHE.CHANGE
   cwhich.box? @
   CURRENT.CPOINT !
     DELETE.CCONTOUR
   REFRESH.CROSS.DRAWING
  then                     \ do the edit
THEN ;


: DO.CCONTOUR.INSERT
 COMMAND.DOWN IF
   BETWEEN.CCONTOUR IF
     CURRENT.CPOINT @ >R
     REFRESH.CROSS.DRAWING
     R> CURRENT.CPOINT !
     MARK.LATHE.CHANGE
     INSERT.CCONTOUR
     REFRESH.CROSS.DRAWING
     TRUE
   ELSE
     FALSE
   THEN
 ELSE
   FALSE
 THEN ;


: DO.CROSS.QUAD
 MAKE.NICE.GRID EXECUTE
 SAVE.CLIP >R
 CURRENT.QUAD @ CLIP.RECT
 CURRENT.O.TOOL @
 CASE
   DOUBLE.ARROW OF
     DO.CCONTOUR.INSERT NOT IF
       DO.CCONTOUR.DELETE
     THEN
     CTUNE.POLY
     DOUBLE.ARROW DEFAULT.O.TOOL !
     ENDOF

   SINGLE.ARROW OF
     DO.CCONTOUR.INSERT NOT IF
       DO.CCONTOUR.DELETE
```

```
\ ANEW O.TOOLS

CR ." Loading O.tools... "

  20 CONSTANT O.TOOL.HEIGHT
  5  CONSTANT  #O.TOOLS
  CREATE  DEFAULT.O.TOOL  1 ,
  CREATE  CURRENT.O.TOOL DEFAULT.O.TOOL @  ,
  CREATE O.TOOLS.RECT    -1 W, -1 W, 0 W, 0 W,

  1 CONSTANT DOUBLE.ARROW
  2 CONSTANT SINGLE.ARROW
  3 CONSTANT O.POLY
  4 CONSTANT  O.CIRCLE
  5 CONSTANT O.RECTANGLE

  \ 6 CONSTANT O.FREE.RAD

: O.TOOL.WIDTH
  V.TOOL.WIDTH ;      \ same width as v.tools

: O.TOOL.HEIGHT
  V.TOOL.HEIGHT ;     \ same width as v.tools


: O.TOOL.BOX        \ same rect as v.tools
  V.TOOL.BOX ;



: IN.O.TOOLS?         \ -- returns false or O.tool number
  @MOUSE.DN DUP
  O.TOOL.BOX PTINRECT IF  \ same box as O.tools
  POINT>XY SWAP DROP
  O.TOOL.HEIGHT / 1 +   \ different height
  ELSE DROP 0 THEN ;


: WHICH.O.TOOL?       \ -- RETURNS  O.TOOL NUMBER
  @MOUSE.DN
  POINT>XY SWAP DROP
  O.TOOL.HEIGHT / 1 +
  1 MAX
  #O.TOOLS MIN ;


: DISPLAY.O.TOOLS       \ DISPLAYS O.TOOL PALETTE
  ASCII PICT
  O.TOOL.PICT   GET.RESOURCE
  DUP IF
      DUP @ 2+ @RECT          \ same rect as O.tools
        ROT  -  O.TOOLS.RECT 6 + W!
        SWAP -  O.TOOLS.RECT 4 + W!
        O.TOOLS.RECT DRAW.PICTURE
  ELSE DROP THEN ;


: (HILITE.O.TOOL)       \ N -- HILITES TOOL
  1- O.TOOL.HEIGHT *
  DUP>R
```

```
0 SWAP
O.TOOL.WIDTH
R> O.TOOL.HEIGHT +
INVERT RECTANGLE ;

: HILITE.O.TOOL
DISPLAY.O.TOOLS
CURRENT.O.TOOL @
(HILITE.O.TOOL) ;


: DO.O.TOOLS
0 LOCALS| HIT.TOOL |
IN.O.TOOLS? IF
  BEGIN
    WHICH.O.TOOL? TO HIT.TOOL
    HIT.TOOL  CURRENT.O.TOOL @ = NOT IF
       HIT.TOOL 1 MAX
       CURRENT.O.TOOL !
       HILITE.O.TOOL
      THEN
  MOUSE.BUTTON NOT UNTIL
THEN ;

: REVERT.O.TOOL
  SHIFT.LOCK.DOWN NOT IF
    DEFAULT.O.TOOL @       \ set default tool current
      CURRENT.O.TOOL !
    HILITE.O.TOOL
  THEN ;

 : TEST.O.TOOLS 8 textmode
 INIT.CURSOR
 HILITE.O.TOOL
 BEGIN  MOUSE.BUTTON IF
     DO.EVENTS DROP
     DO.O.TOOLS
    200 200 move.to
    CURRENT.O.TOOL @ .
 THEN AGAIN ;
```

```
\ TRANSLATES WORLD FOR VIEWING THROUGH CURRENT.OBJECTS FRAME

 ANEW OBJECT.VIEW

 CR
 ." Loading object's viewing... "

 VARIABLE O.COSINES COS.LENGTH ALLOT


 FIND SET.ABSOLUTE CONSTANT ^SET.ABSOLUTE

 : ABSOLUTE.TREE                  \ sets absolute records in tree from relative
   CURRENT.OBJECT @ >R
   OPERATION @ >R
   WORLD.OBJECT SET.CURRENT.OBJECT
   ^SET.ABSOLUTE OPERATION !
   TRAVERSE.DOWN.TREE
   R> OPERATION !
   R> SET.CURRENT.OBJECT ;

 : SET.OBJECTS.VIEWSIDE                  \ cosines preset to object side
  CURRENT.OBJECT @                   \ get current object
  LOCALS| V.OBJECT |
  current.handle IF                  \ if an active little object ...
  V.OBJECT WORLD.OBJECT = NOT IF          \ and not the world itself
   COSINES O.COSINES COS.LENGTH CMOVE
   SET.TEST.VEC                 \ set the test vector
   WORLD.OBJECT SET.CURRENT.OBJECT         \ set world as current
   OBJECT.ACOS COSINES SWAP MOVE.RECORD     \ set cosines to world cosines
   TEST.SWIVEL                  \ swivel the test vec
   V.OBJECT SET.CURRENT.OBJECT         \ set v.object as current
   OBJECT.ACOS COSINES SWAP MOVE.RECORD     \ set cosines to v.object's cosines
   TEST.UN.SWIVEL                  \ un.swivel the test vector
   OBJECT.A3POS PLUCK               \ fetch v.object's absolute position
   WORLD.OBJECT SET.CURRENT.OBJECT         \ set world as current
   OBJECT.A3POS PLUCK               \ fetch world's position
   SUB.3POS                   \ v.objects pos - world.pos
   UN.SWIVEL                   \ un.swivel the vector
   O.COSINES COSINES COS.LENGTH CMOVE       \ use cosines to set view of object
   TEST.SWIVEL
   SWIVEL
   NEG >R NEG >R NEG R> R>             \ make it negative
   OBJECT.A3POS PLACE               \ place in the world's position
   GET.ATTITUDE                \ get the test vector's attitude
   T.VARS OBJECT.ACOS MOVE.RECORD         \ store the test cosines in the world
   OBJECT.A3POS PLUCK
   OBJECT.R3POS PLACE               \ set relative world = to absolute
   OBJECT.ACOS  PLUCK
   OBJECT.RCOS  PLACE
   V.OBJECT SET.CURRENT.OBJECT          \ restore current.object
  THEN
  THEN ;

 : SET.OBJECTS.VIEWPOINT
   CURRENT.OBJECT @                   \ get current object
   LOCALS| V.OBJECT |
   CURRENT.HANDLE IF                  \ if an active little object ...
   V.OBJECT WORLD.OBJECT = NOT IF          \ and not the world itself
    SET.TEST.VEC                 \ set the test vector
    WORLD.OBJECT SET.CURRENT.OBJECT         \ set world as current
    OBJECT.ACOS COSINES SWAP MOVE.RECORD     \ set cosines to world cosines
    TEST.SWIVEL                  \ swivel the test vec
```

```
    V.OBJECT SET.CURRENT.OBJECT          \ set v.object as current
    OBJECT.ACOS COSINES SWAP MOVE.RECORD     \ set cosines to v.object's cosines
    TEST.UN.SWIVEL                  \ un.swivel the test vector
    OBJECT.A3POS PLUCK                \ fetch v.object's absolute position
    WORLD.OBJECT SET.CURRENT.OBJECT         \ set world as current
    OBJECT.A3POS PLUCK                \ fetch world's position
    SUB.3POS                  \ v.objects pos - world.pos
    UN.SWIVEL                   \ un.swivel the vector
    V.OBJECT SET.CURRENT.OBJECT          \ set v.object as current
    SCALE.RANGE DUP
    OBJECT.SCALE PLUCK */
    SC : SCALER
    WORLD.OBJECT SET.CURRENT.OBJECT
    CDISTANCE @ +                   \ move to viewer's eye
    NEG >R NEG >R NEG R> R>             \ make it negative
    OBJECT.A3POS PLACE                \ place in the world's position
    GET.ATTITUDE                  \ get the test vector's attitude
    T.VARS OBJECT.ACOS MOVE.RECORD          \ store the test cosines in the world
    OBJECT.A3POS PLUCK
    OBJECT.R3POS PLACE                \ set relative world = to absolute
    OBJECT.ACOS  PLUCK
    OBJECT.RCOS  PLACE
    V.OBJECT SET.CURRENT.OBJECT          \ set v.object as current
    SCALE.RANGE DUP
    OBJECT.SCALE PLUCK */
    WORLD.OBJECT SET.CURRENT.OBJECT
    dup OBJECT.RSCALE PLACE
    OBJECT.SCALE PLACE
  THEN
  THEN
  V.OBJECT SET.CURRENT.OBJECT  ;          \ restore current.object


   : OBJECTS.VIEWPOINT
   CURRENT.OBJECT @                 \ get current object
   LOCALS| C.OBJECT |
   SET.OBJECTS.VIEWPOINT
   CURRENT.HANDLE IF        \ if an active little object ...
    WORLD.OBJECT SET.CURRENT.OBJECT
    DISPLAY.TWEENING
  THEN
  C.OBJECT SET.CURRENT.OBJECT ;           \ restore current.object


   : DISPLAY.OBJECT.VIEW              \ the.object -- tweens from its view
   LOCALS| C.OBJECT |
   WORLD.OBJECT SET.CURRENT.OBJECT
   OBJECT.ACOS PLUCK
   OBJECT.A3POS PLUCK               \ save the orientation
   OBJECT.SCALE PLUCK               \ save the scale
   SCALE.RANGE
   OBJECT.RSCALE PLACE
   ABSOLUTE.TREE
   C.OBJECT SET.CURRENT.OBJECT          \ set c.object as current
   OBJECTS.VIEWPOINT               \ display from c.object's view
   WORLD.OBJECT SET.CURRENT.OBJECT         \ set world as current
   DUP OBJECT.SCALE PLACE             \ set the scale
   OBJECT.RSCALE PLACE
   OBJECT.A3POS PLACE               \ restore the saved orientation
   OBJECT.ACOS PLACE
   OBJECT.A3POS PLUCK               \ set relatives from absolutes
   OBJECT.R3POS PLACE
   OBJECT.ACOS PLUCK
```

```
OBJECT.RCOS PLACE
C.OBJECT SET.CURRENT.OBJECT ;


: TWEEN.OBJECT.VIEW                  \ presents tween frame from object's view
CURRENT.OBJECT @
LOCALS| C.OBJECT :                   \ current.object is local
WORLD.OBJECT SET.CURRENT.OBJECT         \ set world as current
  TWEEN.COUNT @  1+  0 DO             \ loop for tween count
I TWEEN.FACTOR !                     \ set tweening increment
TWEEN.WORLD                       \ calculate this tween frame
C.OBJECT DISPLAY.OBJECT.VIEW
LOOP                        \ loop till done
C.OBJECT SET.CURRENT.OBJECT ;           \ restore current object
```

```
\ attitude panel for swivel, with drawn indications of relative attitude

cr ." Loading Object Attitude Panel..."

NEW.WINDOW OBJECT.ATT.WINDOW

8101  NEW.DIALOG.RECORD

    1   MAKE.ACTIVE.ITEM    OBJECT.ATT.OK
    2   MAKE.ACTIVE.ITEM    OBJECT.ATT.CANCEL
    3   MAKE.TEXT.ITEM      OBJECT.ATT.YAW
    4   MAKE.TEXT.ITEM      OBJECT.ATT.PITCH
    5   MAKE.TEXT.ITEM      OBJECT.ATT.ROLL
    6   MAKE.TEXT.ITEM      OBJECT.ATT.YAW.MIN
    7   MAKE.TEXT.ITEM      OBJECT.ATT.YAW.MAX
    8   MAKE.TEXT.ITEM      OBJECT.ATT.PITCH.MIN
    9   MAKE.TEXT.ITEM      OBJECT.ATT.PITCH.MAX
    10  MAKE.TEXT.ITEM      OBJECT.ATT.ROLL.MIN
    11  MAKE.TEXT.ITEM      OBJECT.ATT.ROLL.MAX
    12  MAKE.CHECK.ITEM     OBJECT.YAW.LOCK
    13  MAKE.CHECK.ITEM     OBJECT.PITCH.LOCK
    14  MAKE.CHECK.ITEM     OBJECT.ROLL.LOCK
    15  MAKE.CHECK.ITEM     OBJECT.ATT.ABSOLUTE?

NAME.DIALOG.RECORD OBJECT.ATT.PANEL

    0 OBJECT.ATT.ABSOLUTE? !

    : DRAW.ATT.ARROWS
        17 34  56 164 WHITE PATTERN RECTANGLE
        OBJECT.ATT.ABSOLUTE? @
        IF ADRAW.ATT.ARROWS
        ELSE
          RDRAW.ATT.ARROWS
        THEN   ;


: GET.OBJECT.ATTITUDE     ( FETCHES CURRENT.OBJECT TO PANEL )
    GET.OBJECT
    OBJECT.ATT.ABSOLUTE? @ IF
        OBJECT.ACOS PLUCK
    ELSE
        OBJECT.RCOS PLUCK
    THEN
    ANGLE    MAKE.NEG.ANGLE  OBJECT.ATT.YAW     CLEAR.STRING ANGLE>MEASURE$!
    ANGLE    MAKE.NEG.ANGLE  OBJECT.ATT.PITCH   CLEAR.STRING ANGLE>MEASURE$!
    ANGLE    MAKE.NEG.ANGLE  OBJECT.ATT.ROLL    CLEAR.STRING ANGLE>MEASURE$!
    YAW.RANGE PLUCK
    OBJECT.ATT.YAW.MIN  CLEAR.STRING ANGLE>MEASURE$!
    OBJECT.ATT.YAW.MAX  CLEAR.STRING ANGLE>MEASURE$!
    PITCH.RANGE PLUCK
    OBJECT.ATT.PITCH.MIN  CLEAR.STRING ANGLE>MEASURE$!
    OBJECT.ATT.PITCH.MAX  CLEAR.STRING ANGLE>MEASURE$!
    ROL.RANGE PLUCK
    OBJECT.ATT.ROLL.MIN  CLEAR.STRING ANGLE>MEASURE$!
    OBJECT.ATT.ROLL.MAX  CLEAR.STRING ANGLE>MEASURE$!
    LINK.TYPE  PLUCK
    DUP ROL.LOCK      AND IF 1 ELSE 0 THEN  OBJECT.ROLL.LOCK !
    DUP PITCH.LOCK    AND IF 1 ELSE 0 THEN  OBJECT.PITCH.LOCK !
        YAW.LOCK      AND IF 1 ELSE 0 THEN  OBJECT.YAW.LOCK ! ;
```

```
: PUT.OBJECT.ATTITUDE
    MARK.CHANGE                                          \ mark change for undo
    "UNDO.EDIT SET.UNDO$
    ITEM.CHANGED.OF OBJECT.ATT.ROLL @
    ITEM.CHANGED.OF OBJECT.ATT.PITCH @ OR
    ITEM.CHANGED.OF OBJECT.ATT.YAW @ OR
    IF
        OBJECT.ATT.ROLL      MEASURE$>ANGLE   ROL
        OBJECT.ATT.PITCH     MEASURE$>ANGLE   PITCH
        OBJECT.ATT.YAW       MEASURE$>ANGLE   YAW
        OBJECT.ATT.ABSOLUTE? @ IF
            COSINES  OBJECT.ACOS  MOVE.RECORD
            SET.RELATIVE
        ELSE
            COSINES  OBJECT.RCOS  MOVE.RECORD
        THEN
        CHANGED.FLAG @ TREE.CHANGED OR
        CHANGED.FLAG !
        OBJECT.CHANGED
    THEN
    ITEM.CHANGED.OF OBJECT.ATT.YAW.MAX @
    ITEM.CHANGED.OF OBJECT.ATT.YAW.MIN @ OR
    IF
        OBJECT.ATT.YAW.MAX MEASURE$>ANGLE
        OBJECT.ATT.YAW.MIN MEASURE$>ANGLE
        YAW.RANGE PLACE
        OBJECT.CHANGED
    THEN
    ITEM.CHANGED.OF OBJECT.ATT.PITCH.MAX @
    ITEM.CHANGED.OF OBJECT.ATT.PITCH.MIN @ OR
    IF
        OBJECT.ATT.PITCH.MAX MEASURE$>ANGLE
        OBJECT.ATT.PITCH.MIN MEASURE$>ANGLE
        PITCH.RANGE PLACE
        OBJECT.CHANGED
    THEN
    ITEM.CHANGED.OF OBJECT.ATT.ROLL.MAX @
    ITEM.CHANGED.OF OBJECT.ATT.ROLL.MIN @ OR
    IF
        OBJECT.ATT.ROLL.MAX MEASURE$>ANGLE
        OBJECT.ATT.ROLL.MIN MEASURE$>ANGLE
        ROL.RANGE PLACE
        OBJECT.CHANGED
    THEN
    ITEM.CHANGED.OF ROL.LOCK @
    ITEM.CHANGED.OF PITCH.LOCK @  OR
    ITEM.CHANGED.OF YAW.LOCK @  OR
    IF
        LINK.TYPE PLUCK POSITION.LOCK AND
        OBJECT.ROLL.LOCK @   IF ROL.LOCK     ELSE 0 THEN  OR
        OBJECT.PITCH.LOCK @ IF PITCH.LOCK   ELSE 0 THEN  OR
        OBJECT.YAW.LOCK @    IF YAW.LOCK     ELSE 0 THEN  OR
        LINK.TYPE PLACE
        OBJECT.CHANGED
    THEN  ;
```

```
: DO.ATT.CANCEL                                       \ cancel current dialog
  LOCALS| C.ITEM HIT.ITEM C.RECORD |
    DROP 1                                            \ drop the cancel and set
  OBJECT.ATT.WINDOW CLOSE.DIALOG                      \ since this is modeless..
  DPOP DROP ;
```

```
FIND DO.ATT.CANCEL OBJECT.ATT.CANCEL  !          \ set as token for cancel

: DO.ATT.OK
  LOCALS| C.ITEM HIT.ITEM C.RECORD |
  OBJECT.ATT.PANEL  GET.ITEM.DATA
  PUT.OBJECT.ATTITUDE
  OBJECT.ATT.WINDOW CLOSE.DIALOG
  DPOP DROP ;

   FIND DO.ATT.OK OBJECT.ATT.OK !

: DO.ATT.ABSOLUTE
     LOCALS| C.ITEM HIT.ITEM C.RECORD |
     OBJECT.ATT.PANEL  GET.ITEM.DATA
     PUT.OBJECT.ATTITUDE
     C.RECORD HIT.ITEM C.ITEM ^HANDLE.CHECK EXECUTE
     GET.OBJECT.ATTITUDE
     OBJECT.ATT.PANEL SET.ITEMS
     DRAW.ATT.ARROWS ;

   FIND DO.ATT.ABSOLUTE ' OBJECT.ATT.ABSOLUTE? ITEM.HANDLER.TOKEN + !

 : set.attitude.title
        0 SCRATCH.STRING c!
        OBJECT.STRING
        SCRATCH.STRING SWAP EXT
        +PHRASE
        13 203 ResString            \ "  . Attitude"
        SCRATCH.STRING +STRING
        SCRATCH.STRING OBJECT.ATT.WINDOW
       SET.WTITLE   ;

 : UPDATE.OBJECT.ATT.PANEL
    OBJECT.ATT.WINDOW DRAW.DIALOG
    DRAW.ATT.ARROWS ;

: DO.OBJECT.ATT.PANEL
   OBJECT.ATT.PANEL
   CURRENT.OBJECT @
   LOCALS| C.OBJECT C.DIALOG |
   IF OBJECT.ATT.WINDOW DPUSH                     \ push current dialog on d
       set.attitude.title
       GET.OBJECT.ATTITUDE
       C.DIALOG GET.ITEMS                         \ fetch item handles, rect
       C.DIALOG SET.ITEMS                         \ set booleans, text
       DRAW.ATT.ARROWS
      BEGIN                                       \ start of event handling
       DO.EVENTS IN.CLOSE.BOX = IF                \ check for close
               C.DIALOG GET.ITEM.DATA             \ if  CLOSE fetch changes
               PUT.OBJECT.ATTITUDE
               OBJECT.ATT.WINDOW CLOSE.DIALOG
               DPOP DROP                          \ pop dialog from stack
           THEN
       ?KEYSTROKE IF
           CASE
               03 OF C.DIALOG GET.ITEM.DATA       \ if RETURN  fetch changes
                     PUT.OBJECT.ATTITUDE
                     OBJECT.ATT.WINDOW CLOSE.DIALOG
```

```
                DPOP DROP ENDOF
          13 OF  C.DIALOG GET.ITEM.DATA          \ if  ENTER fetch changes
                PUT.OBJECT.ATTITUDE
                OBJECT.ATT.WINDOW CLOSE.DIALOG
                DPOP DROP ENDOF
      ENDCASE
    THEN
   DIALOG.EVENT?                     \ check for dialog events
       IF SWAP DGET = IF             \ if dialog event check for current
       C.DIALOG HANDLE.ITEMS         \ if current handle items
       THEN
       ELSE 2DROP THEN               \ else drop dialog event args
   AGAIN                             \ endless loop until deactivated
ELSE
   OBJECT.ATT.WINDOW ?ACTIVE.WPTR IF
       C.DIALOG GET.ITEM.DATA        \ if deactivated fetch changes
       PUT.OBJECT.ATTITUDE
       OBJECT.ATT.WINDOW CLOSE.DIALOG
       DPOP DROP                     \ pop dialog from stack
   THEN
THEN  ;


: INIT.OBJECT.ATT.WINDOW
    OBJECT.ATT.WINDOW ON.ACTIVATE DO.OBJECT.ATT.PANEL
    OBJECT.ATT.WINDOW ON.UPDATE   UPDATE.OBJECT.ATT.PANEL
    \ 8101 OBJECT.ATT.WINDOW ADD.DIALOG
    ;

: OPEN.OBJECT.ATT.WINDOW
    8101 OBJECT.ATT.WINDOW ADD.DIALOG  ;
```

```
\ OBJECT DRAWING SCRAP

ANEW --OBJECT.DRAWING.SCRAP--

CR ." Loading Object Drawing Scrap"

\ utilities for paste rectangle

2 base !

  create TWINKLE1
    11001100 C,
    01100110 C,
    00110011 C,
    10011001 C,
    11001100 C,
    01100110 C,
    00110011 C,
    10011001 C,

  create TWINKLE2
    10011001 C,
    11001100 C,
    01100110 C,
    00110011 C,
    10011001 C,
    11001100 C,
    01100110 C,
    00110011 C,

  create TWINKLE3
    00110011 C,
    10011001 C,
    11001100 C,
    01100110 C,
    00110011 C,
    10011001 C,
    11001100 C,
    01100110 C,

  create TWINKLE4
    01100110 C,
    00110011 C,
    10011001 C,
    11001100 C,
    01100110 C,
    00110011 C,
    10011001 C,
    11001100 C,

 DECIMAL

  : TWINKLE.PASTE.RECT
     LOCALS| THE.RECT |
     SAVE.CLIP >R
     CURRENT.QUAD @ CLIP.RECT
     1 1 PENSIZE
     PATXOR PENMODE
     TWINKLE1 PENPAT
     THE.RECT
     FRAME.RECT
     2 holding
     THE.RECT
```

```
  FRAME.RECT
  TWINKLE2 PENPAT
  THE.RECT
  FRAME.RECT
  2 holding
  THE.RECT
  FRAME.RECT
  TWINKLE3 PENPAT
  THE.RECT
  FRAME.RECT
  2 holding
  THE.RECT
  FRAME.RECT
  TWINKLE4 PENPAT
  THE.RECT
  FRAME.RECT
  2 holding
  THE.RECT
  FRAME.RECT
  BLACK PENPAT
  R> RESTORE.CLIP ;

\ project.pict utils


: FIND.DOWN.TREE.PICT
  CURRENT.OBJECT @
  0 0 LOCALS| THE.PICT.OBJECT TEMP.OBJECT C.OBJECT |
  DOWN.TREE PLUCK THE.END = NOT IF
    DOWN.TREE PLUCK SET.CURRENT.OBJECT
    BEGIN
      RIGHT.TREE PLUCK TO TEMP.OBJECT
      OBJECT.FORM PLUCK PICT.FORM = IF
        CURRENT.OBJECT @ TO THE.PICT.OBJECT
      THEN
      TEMP.OBJECT THE.END = IF
        -1
      ELSE
        TEMP.OBJECT SET.CURRENT.OBJECT 0
      THEN
    UNTIL
  THEN
  C.OBJECT SET.CURRENT.OBJECT
  THE.PICT.OBJECT ;


: CLEAR.PROJECT.PICT
  CURRENT.OBJECT @
  0 LOCALS| TEMP.OBJECT C.OBJECT
  DOWN.TREE PLUCK THE.END = NOT IF
    DOWN.TREE PLUCK SET.CURRENT.OBJECT
    BEGIN
      RIGHT.TREE PLUCK TO TEMP.OBJECT
      OBJECT.FORM PLUCK PICT.FORM = IF
        CUT.OBJECT
        DELETE.OBJECT.RECORD
      THEN
      TEMP.OBJECT THE.END = IF
        -1
      ELSE
        TEMP.OBJECT SET.CURRENT.OBJECT 0
      THEN
```

```
  UNTIL
 THEN
 C.OBJECT SET.CURRENT.OBJECT ;

: GET.PROJECT.PICT
 CURRENT.OBJECT @
 0 LOCALS| THE.PICT.OBJECT THE.OBJECT |
 FIND.DOWN.TREE.PICT
 TO THE.PICT.OBJECT
 THE.PICT.OBJECT IF
   THE.PICT.OBJECT SET.CURRENT.OBJECT
   GET.PICT.TYPE
   OBJECT.R3POS PLUCK
   FIX>INTEGER DROP
   PICT.OBJECTY !
   PICT.OBJECTX !
   THE.PICT.OBJECT CURRENT.PICT.OBJECT !
 THEN
 THE.OBJECT SET.CURRENT.OBJECT ;

:  PUT.PROJECT.PICT
 CURRENT.OBJECT @
 0 LOCALS| THE.PICT.OBJECT THE.OBJECT
   PUT.OBJECT
 0 TO ERROR.FLAG
 CLEAR.PROJECT.PICT
 GET.NEXT.OBJECT
 SET.OBJECT.DEFAULT                \ be sure to set-up defaults
 CURRENT.OBJECT @ 0 > IF             \ zero is out.of.memory condition
     CURRENT.OBJECT @ TO THE.PICT.OBJECT
   SET.OBJECT.DEFAULT
   THE.OBJECT UP.TREE PLACE
   INSERT.OBJECT
   SET.RELATIVE
   PICT.OBJECTX @
   PICT.OBJECTY @
   0
   INTEGER>FIX OBJECT.R3POS PLACE
   PICT.FORM OBJECT.FORM PLACE
   PUT.PICT.TYPE
   ERROR.FLAG 0= IF
     THE.PICT.OBJECT CURRENT.PICT.OBJECT !
   ELSE
     CUT.OBJECT
       DELETE.OBJECT.RECORD
   THEN
  ELSE
   -108 TO ERROR.FLAG
   DO.ERROR.ALERT
  THEN
  THE.OBJECT SET.CURRENT.OBJECT
  THE.OBJECT GET.OBJECT ;

: DELETE.PROJECT.PICT
  CLEAR.PROJECT.PICT
  DELETE.OBJECT.PICT
  0 CURRENT.PICT.OBJECT !  ;

: (COPY.WIREFRAME)              \ write a pict from the current object
    0 LOCALS| C.PICT            \ define locals
```

```
    SAVE.CLIP >R
    WIRE.QUAD CLIP.RECT
    WIRE.QUAD OPEN.PICTURE
    TO C.PICT            \ open the picture
      SC @ >R
      SCALE.RANGE SC !
      8 PENMODE
      QPOLY.FRAME
      R> SC !
      CLOSE.PICTURE          \ close the picture
  R> RESTORE.CLIP
  C.PICT HANDLE.TO.SCRAP ;

: COPY.PROJECT.PICT
  GET.PROJECT.PICT
  CURRENT.OBJECT.PICT 0 = not IF
    (COPY.OBJECT.PICT)
  ELSE
    (COPY.WIREFRAME)
  THEN ;

: CUT.PROJECT.PICT
  (COPY.OBJECT.PICT)
  DELETE.PROJECT.PICT ;

: SET.PROJECT.ATTITUDE
    CURRENT.OBJECT @
    LOCALS| C.OBJECT |
    C.OBJECT WORLD.OBJECT > IF
      CURRENT.PICT.OBJECT @ IF
        SET.TEST.VEC
        CURRENT.PICT.OBJECT @ SET.CURRENT.OBJECT
        OBJECT.RCOS COSINES SWAP MOVE.RECORD
        TEST.UN.SWIVEL
        GET.ATTITUDE
        T.VARS COSINES COS.LENGTH CMOVE
      THEN
    THEN
    C.OBJECT SET.CURRENT.OBJECT  ;

: (DRAW.PROJECT.PICT)
  DELETE.OBJECT.PICT
  GET.PROJECT.PICT
  CURRENT.OBJECT.PICT 0 = not IF
    SAVE.CLIP >R
    CURRENT.QUAD @ @RECT
    2 - SWAP 2 - SWAP
    2SWAP 1+ SWAP 1+ SWAP
    2SWAP TEMP.RECT !RECT
    TEMP.RECT CLIP.RECT
    CURRENT.OBJECT.PICT @ 2+ @RECT
    TRANS.PICT.RECT           \ Y X Y X
    >NORMAL.SCALE SWAP >NORMAL.SCALE  \ scale shift
    CURRENT.QUAD @ >TRANSLATE       \  Y X 'X 'Y
    SWAP  2SWAP              \ 'Y 'X Y X
    >NORMAL.SCALE SWAP >NORMAL.SCALE  \ scale shift
    CURRENT.QUAD @ >TRANSLATE       \ 'Y 'X ^X ^Y
    SWAP 2SWAP               \ ^Y ^X 'Y 'X
    TRACE.RECT !RECT
    CURRENT.OBJECT.PICT
    TRACE.RECT
    DRAW.PICTURE
```

```
  R> RESTORE.CLIP
  FULL.QUAD @ IF
    SET.PROJECT.ATTITUDE
  THEN
THEN ;

: CURRENT.PROJECT.RECT
  CURRENT.OBJECT.PICT IF
  CURRENT.OBJECT.PICT @ 2+ @RECT
  TRANS.PICT.RECT            \ Y X Y X
  >NORMAL.SCALE SWAP >NORMAL.SCALE
  CURRENT.QUAD @ >TRANSLATE       \  Y X 'X 'Y
  SWAP  2SWAP              \ 'Y 'X Y X
  >NORMAL.SCALE SWAP >NORMAL.SCALE
  CURRENT.QUAD @ >TRANSLATE       \ 'Y 'X ^X ^Y
  SWAP 2SWAP               \ ^Y ^X 'Y 'X
  TEMP.RECT !RECT
   ELSE
  0 0 0 0 TEMP.RECT !RECT
   THEN
   TEMP.RECT ;

: DRAG.PROJECT.PICT
  PICT.OBJECTX @
  PICT.OBJECTY @
  0 0 LOCALS! THEX THEY OY OX
  @MOUSE.DN CURRENT.PROJECT.RECT PTINRECT IF
    @MOUSE.DN POINT>XY
    TO THEY TO THEX
    PATXOR PENMODE
    SAVE.CLIP >R
    CURRENT.QUAD @ CLIP.RECT
    GRAY PENPAT
    BEGIN
      DO.EVENTS DROP
      STILL.DOWN WHILE
      @MOUSE CURRENT.QUAD @ PTINRECT IF
        @MOUSEXY
        THEY - OY +
        PICT.OBJECTY !
        THEX - OX +
        PICT.OBJECTX !
        CURRENT.PROJECT.RECT
        FRAME.RECT
        MOVE/UNCLICK
        1 holding
        CURRENT.PROJECT.RECT
        FRAME.RECT
      THEN
    REPEAT
    BLACK PENPAT
    R> RESTORE.CLIP
    CURRENT.PICT.OBJECT @ IF
      CURRENT.OBJECT @ >R
      CURRENT.PICT.OBJECT @
      SET.CURRENT.OBJECT
      PICT.OBJECTX @
      PICT.OBJECTY @
      0
      INTEGER>FIX
      OBJECT.R3POS PLACE
      OBJECT.CHANGED
```

```
    R> SET.CURRENT.OBJECT
   THEN
   REFRESH.THE.QUAD
  THEN ;

: PASTE.PROJECT.PICT
  current.object @
  locals| the.object
  DELETE.PROJECT.PICT
  0 PICT.OBJECTX !
  0 PICT.OBJECTY !
  SCRAP.TO.HANDLE
  TO CURRENT.OBJECT.PICT
  CURRENT.OBJECT.PICT IF
    PUT.PROJECT.PICT
    CURRENT.PICT.OBJECT @ IF
      REFRESH.THE.QUAD
      BEGIN
        CURRENT.PROJECT.RECT
        TWINKLE.PASTE.RECT
        DO.EVENTS
        MOUSE.DOWN = IF
          @MOUSE.DN CURRENT.QUAD @ PTINRECT IF
            @MOUSE.DN CURRENT.PROJECT.RECT
            PTINRECT IF
              DRAG.PROJECT.PICT  0
            ELSE
              -1
            THEN
          ELSE -1 THEN
        ELSE 0 THEN
      UNTIL
    ELSE
      DELETE.OBJECT.PICT
    THEN
  THEN
  the.object set.current.object ;

: TRANS.TRACE.RECT
  0 0 LOCALS| MIDY MIDX  TX2 TY2 TX1 TY1
   TY2 TY1 + 2/ TO MIDY
   TX2 TX1 + 2/ TO MIDX
   TY1 MIDY -  PICT.TRACE.Y @ +
   TX1 MIDX -  PICT.TRACE.X @ +
   TY2 MIDY -  PICT.TRACE.Y @ +
   TX2 MIDX -  PICT.TRACE.X @ +  ;

: DELETE.TRACE.PICT
  TRACE.PICT 0= NOT IF
  TRACE.PICT HANDLE.SIZE 0 > IF
    TRACE.PICT DISPOSE.PICTURE              \ release the memory
  THEN
  0 TO TRACE.PICT
  THEN ;

: COPY.TRACE.PICT
  TRACE.PICT
  HANDLE.TO.SCRAP ;

: CUT.TRACE.PICT
  COPY.TRACE.PICT
```

```
DELETE.TRACE.PICT ;

: (DRAW.TRACE.PICT)
  TRACE.PICT 0 = not IF
    SAVE.CLIP >R
    CURRENT.QUAD @ @RECT
    2 - SWAP 2 - SWAP
    2SWAP 1+ SWAP 1+ SWAP
    2SWAP TEMP.RECT !RECT
    TEMP.RECT CLIP.RECT
    TRACE.PICT @ 2+ @RECT
    TRANS.TRACE.RECT            \ Y X Y X
    >NORMAL.SCALE SWAP >NORMAL.SCALE
    CURRENT.QUAD @ >TRANSLATE        \  Y X 'X 'Y
    SWAP  2SWAP              \ 'Y 'X Y X
    >NORMAL.SCALE SWAP >NORMAL.SCALE
    CURRENT.QUAD @ >TRANSLATE        \ 'Y 'X ^X ^Y
    SWAP 2SWAP               \ ^Y ^X 'Y 'X
    TRACE.RECT !RECT
    TRACE.PICT
    TRACE.RECT
    DRAW.PICTURE
    R> RESTORE.CLIP
  THEN ;

  : CURRENT.TRACE.RECT
    TRACE.PICT IF
    TRACE.PICT @ 2- @RECT
    TRANS.TRACE.RECT            \ Y X Y X
    >NORMAL.SCALE SWAP >NORMAL.SCALE
    CURRENT.QUAD @ >TRANSLATE        \  Y X 'X 'Y
    SWAP  2SWAP              \ 'Y 'X Y X
    >NORMAL.SCALE SWAP >NORMAL.SCALE
    CURRENT.QUAD @ >TRANSLATE        \ 'Y 'X ^X ^Y
    SWAP 2SWAP               \ ^Y ^X 'Y 'X
    TEMP.RECT !RECT
     ELSE
    0 0 0 0 TEMP.RECT !RECT
     THEN
     TEMP.RECT ;

  : DRAG.TRACE.PICT
    PICT.TRACE.X @
    PICT.TRACE.Y @
    0 0 LOCALS| THEX THEY OY OX
    @MOUSE.DN CURRENT.TRACE.RECT PTINRECT IF
      @MOUSE.DN POINT>XY
      TO THEY TO THEX
      PATXOR PENMODE
      SAVE.CLIP >R
      CURRENT.QUAD @ CLIP.RECT
      GRAY PENPAT
      BEGIN
        DO.EVENTS DROP
        STILL.DOWN WHILE
        @MOUSE CURRENT.QUAD @ PTINRECT IF
          @MOUSEXY
          THEY - OY +
          PICT.TRACE.Y !
          THEX - OX +
          PICT.TRACE.X !
```

```
        CURRENT.TRACE.RECT
        FRAME.RECT
        MOVE/UNCLICK
        1 holding
        CURRENT.TRACE.RECT
        FRAME.RECT
      THEN
    REPEAT
    BLACK PENPAT
    R> RESTORE.CLIP
    REFRESH.THE.QUAD
  THEN ;

: PASTE.TRACE.PICT
  current.object @
  locals| the.object |
  DELETE.TRACE.PICT
  0 PICT.TRACE.X !
  0 PICT.TRACE.Y !
  SCRAP.TO.HANDLE
  TO TRACE.PICT
  TRACE.PICT IF
    REFRESH.THE.QUAD
    BEGIN
      CURRENT.TRACE.RECT
      TWINKLE.PASTE.RECT
      DO.EVENTS
      MOUSE.DOWN = IF
        @MOUSE.DN CURRENT.QUAD @ PTINRECT IF
          @MOUSE.DN CURRENT.TRACE.RECT
          PTINRECT IF
            DRAG.TRACE.PICT  0
          ELSE
             -1            \ in this case, exit
          THEN
        ELSE -1  THEN
      ELSE 0 THEN
    UNTIL
  THEN
  the.object set.current.object ;


: DRAW.OBJECT.PICT
  CURRENT.QUAD @
  WIRE.QUAD = IF
    (DRAW.PROJECT.PICT)
  ELSE
    (DRAW.TRACE.PICT)
  THEN ;

FIND DRAW.OBJECT.PICT ' ^DRAW.TRACE.PICT !


: COPY.OBJECT.DRAWING
  FULL.QUAD @ CASE
    WIRE.QUAD  OF  COPY.PROJECT.PICT ENDOF
    CROSS.QUAD OF  COPY.TRACE.PICT ENDOF
    TOP.QUAD   OF  COPY.TRACE.PICT ENDOF
    SIDE.QUAD  OF  COPY.TRACE.PICT ENDOF
  ENDCASE ;

: PASTE.OBJECT.DRAWING
```

```
FULL.QUAD @ CASE
  WIRE.QUAD OF
    PASTE.PROJECT.PICT
  ENDOF
  CROSS.QUAD OF
    PASTE.TRACE.PICT
    REFRESH.THE.QUAD ENDOF
  TOP.QUAD   OF
    PASTE.TRACE.PICT
    REFRESH.THE.QUAD ENDOF
  SIDE.QUAD  OF
    PASTE.TRACE.PICT
    REFRESH.THE.QUAD ENDOF
ENDCASE ;

: CUT.OBJECT.DRAWING
  FULL.QUAD @ CASE
    WIRE.QUAD OF   CUT.PROJECT.PICT
      REFRESH.THE.QUAD ENDOF
    CROSS.QUAD OF   CUT.TRACE.PICT
      REFRESH.THE.QUAD ENDOF
    TOP.QUAD    OF   CUT.TRACE.PICT
      REFRESH.THE.QUAD ENDOF
    SIDE.QUAD   OF   CUT.TRACE.PICT
      REFRESH.THE.QUAD ENDOF
  ENDCASE ;

: DELETE.OBJECT.DRAWING
  FULL.QUAD @ CASE
    WIRE.QUAD OF   DELETE.PROJECT.PICT
      REFRESH.THE.QUAD ENDOF
    CROSS.QUAD OF   DELETE.TRACE.PICT
      REFRESH.THE.QUAD ENDOF
    TOP.QUAD    OF   DELETE.TRACE.PICT
      REFRESH.THE.QUAD ENDOF
    SIDE.QUAD   OF   DELETE.TRACE.PICT
      REFRESH.THE.QUAD ENDOF
  ENDCASE ;
```

```
\ OBJECT INFO EDIT

604 MakeSwapOver DO.OBJECT.INFO

StartSwapOver

14126  NEW.DIALOG.RECORD

 1 MAKE.ACTIVE.ITEM INFO.OK
 2 MAKE.ACTIVE.ITEM INFO.CANCEL
 3 MAKE.TEXT.ITEM  INFO.FIELD.0
 4 MAKE.TEXT.ITEM  INFO.FIELD.1
 5 MAKE.TEXT.ITEM  INFO.FIELD.2
 6 MAKE.TEXT.ITEM  INFO.FIELD.3
 7 MAKE.TEXT.ITEM  INFO.FIELD.4
 8 MAKE.TEXT.ITEM  INFO.FIELD.5
 9 MAKE.TEXT.ITEM  INFO.FIELD.6
10 MAKE.TEXT.ITEM  INFO.FIELD.7
11 MAKE.TEXT.ITEM  INFO.TITLE.0
12 MAKE.TEXT.ITEM  INFO.TITLE.1
13 MAKE.TEXT.ITEM  INFO.TITLE.2
14 MAKE.TEXT.ITEM  INFO.TITLE.3
15 MAKE.TEXT.ITEM  INFO.TITLE.4
16 MAKE.TEXT.ITEM  INFO.TITLE.5
17 MAKE.TEXT.ITEM  INFO.TITLE.6
18 MAKE.TEXT.ITEM  INFO.TITLE.7
19 MAKE.TEXT.ITEM  INFO.NAME

NAME.DIALOG.RECORD OBJECT.INFO


  : GET.OBJECT.INFO
    CURRENT.OBJECT @ >R
    WORLD.OBJECT SET.CURRENT.OBJECT
    OBJECT.TEXT.FIELD0 INFO.TITLE.0 SWAP MOVE.RECORD
    OBJECT.TEXT.FIELD1 INFO.TITLE.1 SWAP MOVE.RECORD
    OBJECT.TEXT.FIELD2 INFO.TITLE.2 SWAP MOVE.RECORD
    OBJECT.TEXT.FIELD3 INFO.TITLE.3 SWAP MOVE.RECORD
    OBJECT.TEXT.FIELD4 INFO.TITLE.4 SWAP MOVE.RECORD
    OBJECT.TEXT.FIELD5 INFO.TITLE.5 SWAP MOVE.RECORD
    OBJECT.TEXT.FIELD6 INFO.TITLE.6 SWAP MOVE.RECORD
    OBJECT.TEXT.FIELD7 INFO.TITLE.7 SWAP MOVE.RECORD
    R> SET.CURRENT.OBJECT
    OBJECT.TEXT.FIELD0 INFO.FIELD.0 SWAP MOVE.RECORD
    OBJECT.TEXT.FIELD1 INFO.FIELD.1 SWAP MOVE.RECORD
    OBJECT.TEXT.FIELD2 INFO.FIELD.2 SWAP MOVE.RECORD
    OBJECT.TEXT.FIELD3 INFO.FIELD.3 SWAP MOVE.RECORD
    OBJECT.TEXT.FIELD4 INFO.FIELD.4 SWAP MOVE.RECORD
    OBJECT.TEXT.FIELD5 INFO.FIELD.5 SWAP MOVE.RECORD
    OBJECT.TEXT.FIELD6 INFO.FIELD.6 SWAP MOVE.RECORD
    OBJECT.TEXT.FIELD7 INFO.FIELD.7 SWAP MOVE.RECORD
    INFO.NAME CLEAR.STRING
    OBJECT.STRING INFO.NAME 1+ SWAP MOVE.RECORD
    INFO.NAME OBJECT.STRING SWAP DROP EXT C!
      ;


  : PUT.OBJECT.INFO
    INFO.FIELD.0 OBJECT.TEXT.FIELD0 MOVE.RECORD
    INFO.FIELD.1 OBJECT.TEXT.FIELD1 MOVE.RECORD
    INFO.FIELD.2 OBJECT.TEXT.FIELD2 MOVE.RECORD
    INFO.FIELD.3 OBJECT.TEXT.FIELD3 MOVE.RECORD
    INFO.FIELD.4 OBJECT.TEXT.FIELD4 MOVE.RECORD
```

```
  INFO.FIELD.5 OBJECT.TEXT.FIELD5 MOVE.RECORD
  INFO.FIELD.6 OBJECT.TEXT.FIELD6 MOVE.RECORD
  INFO.FIELD.7 OBJECT.TEXT.FIELD7 MOVE.RECORD
  INFO.NAME 1+ OBJECT.STRING MOVE.RECORD
    OBJECT.CHANGED ;

: DO.INFO.CANCEL                      \ cancel current dialog
  LOCALS| C.ITEM HIT.ITEM C.RECORD |
    DROP 1                ;           \ since this is modeless... close the window

FIND DO.INFO.CANCEL INFO.CANCEL !

: DO.INFO.OK
  LOCALS| C.ITEM HIT.ITEM C.RECORD |
  OBJECT.INFO  GET.ITEM.DATA
  PUT.OBJECT.INFO ;

FIND DO.INFO.OK INFO.OK !

: (DO.OBJECT.INFO)
  GET.OBJECT.INFO
  OBJECT.INFO HANDLE.DIALOG  ;

SetSwapOverToken
EndSwapOver
```

```
\ Object menu for the Swiv
\ Last Revision: 07/29/87  09:53:32 AM   YH

cr ." Loading Object Menu..."

\ Anew Object.Menu.Stuff


 : (TWEEN.TO.OBJECT.VIEW)
   WORLD.OUTPUT BRING.TO.FRONT
   CURRENT.OBJECT @                   \ get current object
   LOCALS! V.OBJECT !                 \ save the current object
   WORLD.OBJECT  SET.CURRENT.OBJECT          \ set world as current
   "UNDO.WORLD.MOVE SET.UNDOS          \ save undo state
    MARK.CHANGE
    SAVE.TWEEN.VARS                   \ save world tween records on stack
    0 CURRENT.KEY !
  LOOP.TWEEN? OFF
    SET.KEY.OBJECT.FRAME
    V.OBJECT SET.CURRENT.OBJECT              \ set v.object as current
    SET.OBJECTS.VIEWSIDE               \ set the world relative to v.object
    WORLD.OBJECT SET.CURRENT.OBJECT            \ set the world current
    1 CURRENT.KEY !
    1 KEY.COUNT !
    SET.KEY.OBJECT.FRAME
    10 TWEEN.COUNT !                   \ set number of frames to 30
  0 CURRENT.KEY !
    CLEAR.REDRAW RE.TOGGLE CLEAR.REDRAW         \ clear the line cursor
    0 DRAW.CHECK !
    DO.WORLD.CURSOR.TWEEN              \ do the tweening
    CLEAR.REDRAW RE.TOGGLE CLEAR.REDRAW         \ clear the line cursor
    0 DRAW.CHECK !                    \ clear the cursor buffer
    REDRAW.WORLD SHOW.CURSOR              \ redraw the world in it's new location
  RESTORE.TWEEN.VARS
    V.OBJECT SET.CURRENT.OBJECT
    GET.WINDOW WORLD.OUTPUT = IF
  SET.SCROLL THEN  ;                  \ restore current object

  : TWEEN.TO.OBJECT.VIEW
  CURRENT.OBJECT @
  WORLD.OBJECT = NOT IF
    (TWEEN.TO.OBJECT.VIEW)
  THEN ;



  1 CONSTANT  EditObject
  2 constant  SkinTree
    4 constant  ObjectPosPanel
  5 constant  ObjectattPanel
  7 constant  AlignObject
  8 constant  ObjectsView...
   10 constant  PosRulers
   11 constant  AttitudeGrid
   12 constant  ObjectForm
   14 constant  DrawGrid
   15 constant  PolarGrid
   16 constant  UseRulers


    : Setup.Object.Menu
    IN.OBJECT.DRAWING @ FALSE = IF
    current.object @ WORLD.OBJECT = IF
```

```
    1
    24 202 ResString         \ " Design New Object..."
    OBJECT.MENU SET.ITEMS
    SkinTree     FALSE OBJECT.MENU ITEM.ENABLE
    ObjectPosPanel  FALSE OBJECT.MENU ITEM.ENABLE
    ObjectattPanel  FALSE OBJECT.MENU ITEM.ENABLE
    AlignObject   FALSE OBJECT.MENU ITEM.ENABLE
    ObjectsView...  FALSE OBJECT.MENU ITEM.ENABLE
    ObjectForm    FALSE OBJECT.MENU ITEM.ENABLE
  ELSE
    1
    25 202 ResString         \ " Redesign Object..."
    OBJECT.MENU SET.ITEMS
    SkinTree     TRUE OBJECT.MENU ITEM.ENABLE
    ObjectPosPanel  TRUE OBJECT.MENU ITEM.ENABLE
    ObjectattPanel  TRUE OBJECT.MENU ITEM.ENABLE
    AlignObject   TRUE OBJECT.MENU ITEM.ENABLE
    ObjectsView...  TRUE OBJECT.MENU ITEM.ENABLE
      ObjectForm    TRUE OBJECT.MENU ITEM.ENABLE
  THEN
  THEN ;

find SETUP.OBJECT.MENU ' ^SETUP.OBJECT.MENU !


: INIT.OBJECT
  0
  26 202 ResString        \ " Object "
  OBJECT.MENU NEW.MENU
    27 202 ResString        \ " Redesign Object.../R;Create Skin Object;-("
  OBJECT.MENU APPEND.ITEMS
  28 202 ResString        \ " Object Position.../W;Object Attitude.../E;-("
  OBJECT.MENU APPEND.ITEMS
  29 202 ResString        \ " Align Object;Object's View "
  OBJECT.MENU APPEND.ITEMS
  30 202 ResString        \ " -(;Rulers...;Attitude Grid...;Object Form...;-("
  OBJECT.MENU APPEND.ITEMS
  31 202 ResString        \ " Use Draw Grid;Polar Grid;Show Rulers"
  OBJECT.MENU APPEND.ITEMS
  ^InitXEditorMenu execute
  ;

create object.view 1 ,


: OBJECT.MENU.OFF
  IN.OBJECT.DRAWING @ IF
    EditObject    TRUE  OBJECT.MENU ITEM.ENABLE
    1
    32 202 ResString        \ " Return to World..."
    OBJECT.MENU SET.ITEMS
      SkinTree    FALSE OBJECT.MENU ITEM.ENABLE
      ObjectPosPanel  FALSE OBJECT.MENU ITEM.ENABLE
    ObjectattPanel  FALSE OBJECT.MENU ITEM.ENABLE
    AlignObject   FALSE OBJECT.MENU ITEM.ENABLE
    ObjectsView...  FALSE OBJECT.MENU ITEM.ENABLE
      PosRulers     TRUE  OBJECT.MENU ITEM.ENABLE
      AttitudeGrid    FALSE OBJECT.MENU ITEM.ENABLE
      ObjectForm    FALSE OBJECT.MENU ITEM.ENABLE
      DrawGrid      TRUE  OBJECT.MENU ITEM.ENABLE
      PolarGrid     TRUE  OBJECT.MENU ITEM.ENABLE
      UseRulers     TRUE  OBJECT.MENU ITEM.ENABLE
  ELSE
```

```
  0 FALSE OBJECT.MENU ITEM.ENABLE
 THEN ;

: OBJECT.MENU.ON
   0 TRUE OBJECT.MENU ITEM.ENABLE
   EditObject    TRUE  OBJECT.MENU ITEM.ENABLE
   1
   25 202 ResString        \ " Redesign Object..."
   OBJECT.MENU SET.ITEMS
   SkinTree    TRUE  OBJECT.MENU ITEM.ENABLE
     ObjectPosPanel  TRUE  OBJECT.MENU ITEM.ENABLE
   ObjectattPanel  TRUE  OBJECT.MENU ITEM.ENABLE
   AlignObject   TRUE  OBJECT.MENU ITEM.ENABLE
   ObjectsView...  TRUE  OBJECT.MENU ITEM.ENABLE
     PosRulers     TRUE  OBJECT.MENU ITEM.ENABLE
     AttitudeGrid    TRUE  OBJECT.MENU ITEM.ENABLE
     ObjectForm    TRUE  OBJECT.MENU ITEM.ENABLE
     DrawGrid      FALSE  OBJECT.MENU ITEM.ENABLE
     PolarGrid     FALSE  OBJECT.MENU ITEM.ENABLE
     UseRulers     FALSE  OBJECT.MENU ITEM.ENABLE
     ;

: TOGGLE.2GRID
  USE.GRID? @ IF
   0 USE.GRID? !
   DrawGrid FALSE OBJECT.MENU ITEM.CHECK
  ELSE
   -1 USE.GRID? !
   DrawGrid TRUE OBJECT.MENU ITEM.CHECK
  THEN ;

: TOGGLE.POLAR
  POLAR? @ IF
   0 POLAR? !
   PolarGrid  FALSE OBJECT.MENU ITEM.CHECK
  ELSE
   -1 POLAR? !
   PolarGrid TRUE OBJECT.MENU ITEM.CHECK
  THEN
  IN.OBJECT.DRAWING @ IF
   CURRENT.QUAD @ >R
   SAVE.CLIP >R
   current.point @ >R
   current.cpoint @ >R
   DISPLAY.QUADS
   R> CURRENT.CPOINT !
   R> CURRENT.POINT !
   R> RESTORE.CLIP
   R> CURRENT.QUAD !
  THEN  ;

: TOGGLE.RULERS
  RULERS?  IF
   0 to RULERS?
   UseRulers  FALSE OBJECT.MENU ITEM.CHECK
  ELSE
   -1 to RULERS?
   UseRulers TRUE OBJECT.MENU ITEM.CHECK
  THEN
  IN.OBJECT.DRAWING @ IF
   CURRENT.QUAD @ >R
```

```
    SAVE.CLIP >R
    current.point @ >R
    current.cpoint @ >R
    DISPLAY.QUADS
    R> CURRENT.CPOINT !
    R> CURRENT.POINT !
    R> RESTORE.CLIP
    R> CURRENT.QUAD !
  THEN  ;


: OBJECT.MENU.SELECT
  OBJECT.MENU MENU.SELECTION:
  dup
   CASE
  EditObject  OF
    DO.OBJECT.EDIT.MENU ENDOF
  SkinTree  OF
    SKIN.TREE
    DISPLAY.WORLD  ENDOF
  ObjectPosPanel    OF
    CURRENT.OBJECT @
    WORLD.OBJECT = NOT IF
      OPEN.OBJECT.POS.WINDOW
    THEN  ENDOF
  ObjectAttPanel    OF
    CURRENT.OBJECT @
    WORLD.OBJECT = NOT IF
      OPEN.OBJECT.Att.WINDOW
    THEN  ENDOF
    PosRulers     OF  DO.RULER.PANEL  ENDOF
  AttitudeGrid  OF  DO.ATT.PANEL  ENDOF
  ObjectForm    OF  DO.DESIGN.PANEL ENDOF
  DrawGrid     OF  TOGGLE.2GRID  ENDOF
  PolarGrid     OF  TOGGLE.POLAR  ENDOF
  UseRulers     OF  TOGGLE.RULERS   ENDOF
 ENDCASE
 UseRulers - ^HandleXEditorMenu execute
 0 HILITE.MENU  ;


16 CONSTANT OBJECT.VIEW.MENU

 : INIT.OBJECT.VIEW
   -1
   26 202 ResString         \ " Object "
   OBJECT.VIEW.MENU NEW.MENU
   33 202 ResString         \ " Front;Back;Left;Right;Top;Bottom"
     OBJECT.VIEW.MENU APPEND.ITEMS ;


 : OBJECT.VIEW.MENU.SELECT
     OBJECT.VIEW.MENU MENU.SELECTION:
       CASE
   1   OF
     FRONT.COS COSINES COS.LENGTH CMOVE
     TWEEN.TO.OBJECT.VIEW ENDOF
       2   OF
     BACK.COS COSINES COS.LENGTH CMOVE
     TWEEN.TO.OBJECT.VIEW ENDOF
       3   OF
     LEFT.COS COSINES COS.LENGTH CMOVE
     TWEEN.TO.OBJECT.VIEW ENDOF
```

```
      4   OF
    RIGHT.COS COSINES COS.LENGTH CMOVE
    TWEEN.TO.OBJECT.VIEW ENDOF
      5     OF
    TOP.COS COSINES COS.LENGTH CMOVE
    TWEEN.TO.OBJECT.VIEW ENDOF
      6   OF
    BOTTOM.COS COSINES COS.LENGTH CMOVE
    TWEEN.TO.OBJECT.VIEW ENDOF
  ENDCASE
  0 HILITE.MENU  ;

18 CONSTANT OBJECT.ALIGNMENT

  : INIT.OBJECT.ALIGNMENT
    -1
    26 202 ResString              \ " Object "
    OBJECT.ALIGNMENT NEW.MENU
    34 202 ResString              \ " Align All;Align Attitude;Align Position"
    OBJECT.ALIGNMENT APPEND.ITEMS
    OBJECT.ALIGNMENT MENU.SELECTION:
        CASE
    1   OF
      "UNDO.MOVE SET.UNDOS            \ save undo state
        MARK.CHANGE
      0 0 0 OBJECT.R3POS PLACE
      0 YAW 0 PITCH 0 ROL
      COSINES OBJECT.RCOS MOVE.RECORD
      GET.OBJECT
      OBJECT.CHANGED
      REDRAW.OBJECT
      DISPLAY.WORLD ENDOF
        2   OF
      "UNDO.MOVE SET.UNDOS            \ save undo state
        MARK.CHANGE
      0 YAW 0 PITCH 0 ROL
      COSINES OBJECT.RCOS MOVE.RECORD
      GET.OBJECT
      OBJECT.CHANGED
      REDRAW.OBJECT
      DISPLAY.WORLD ENDOF
        3   OF
      "UNDO.MOVE SET.UNDOS            \ save undo state
        MARK.CHANGE
      0 0 0 OBJECT.R3POS PLACE
      GET.OBJECT
      OBJECT.CHANGED
      REDRAW.OBJECT
      DISPLAY.WORLD ENDOF
    ENDCASE
    0 HILITE.MENU  ;

  : INSTALL.OBJECT.MENU
    INIT.OBJECT
    OBJECT.MENU.SELECT
    INIT.OBJECT.VIEW
    OBJECT.VIEW.MENU.SELECT
    INIT.OBJECT.ALIGNMENT
    OBJECT.VIEW.MENU ObjectsView...
    OBJECT.MENU Install.Hier
    OBJECT.ALIGNMENT AlignObject
    OBJECT.MENU Install.Hier ;
```

```
\ Object menu for the Swiv
\ Last Revision: 07/29/87  09:53:32 AM   YH

cr ." Loading Object Menu..."

\ Anew Object.Menu.Stuff


 : (TWEEN.TO.OBJECT.VIEW)
   WORLD.OUTPUT BRING.TO.FRONT
   CURRENT.OBJECT @                    \ get current object
   LOCALS| V.OBJECT |                   \ save the current object
   WORLD.OBJECT  SET.CURRENT.OBJECT          \ set world as current
   "UNDO.WORLD.MOVE SET.UNDOS           \ save undo state
    MARK.CHANGE
    SAVE.TWEEN.VARS                    \ save world tween records on stack
    0 CURRENT.KEY !
  LOOP.TWEEN? OFF
    SET.KEY.OBJECT.FRAME
    V.OBJECT SET.CURRENT.OBJECT             \ set v.object as current
    SET.OBJECTS.VIEWSIDE                \ set the world relative to v.object
    WORLD.OBJECT SET.CURRENT.OBJECT           \ set the world current
    1 CURRENT.KEY !
    1 KEY.COUNT !
    SET.KEY.OBJECT.FRAME
    10 TWEEN.COUNT !                   \ set number of frames to 30
  0 CURRENT.KEY !
    CLEAR.REDRAW RE.TOGGLE CLEAR.REDRAW         \ clear the line cursor
    0 DRAW.CHECK !
    DO.WORLD.CURSOR.TWEEN               \ do the tweening
    CLEAR.REDRAW RE.TOGGLE CLEAR.REDRAW         \ clear the line cursor
    0 DRAW.CHECK !                     \ clear the cursor buffer
    REDRAW.WORLD SHOW.CURSOR             \ redraw the world in it's new location
  RESTORE.TWEEN.VARS
    V.OBJECT SET.CURRENT.OBJECT
    GET.WINDOW WORLD.OUTPUT - IF
  SET.SCROLL THEN  ;                   \ restore current object

  : TWEEN.TO.OBJECT.VIEW
  CURRENT.OBJECT @
  WORLD.OBJECT = NOT IF
    (TWEEN.TO.OBJECT.VIEW)
  THEN ;



  1 CONSTANT  EditObject
  2 constant  SkinTree
    4 constant  ObjectPosPanel
  5 constant  ObjectattPanel
  7 constant  AlignObject
  8 constant  ObjectsView...
   10 constant  PosRulers
   11 constant  AttitudeGrid
   12 constant  ObjectForm
   13 constant  IsaacFlags
   15 constant  DrawGrid
   16 constant  PolarGrid
   17 constant  UseRulers


    : Setup.Object.Menu
    IN.OBJECT.DRAWING @ FALSE = IF
```

```
current.object @ WORLD.OBJECT = IF
  1
  24 202 ResString        \ " Design New Object..."
  OBJECT.MENU SET.ITEMS
  SkinTree     FALSE OBJECT.MENU ITEM.ENABLE
  ObjectPosPanel  FALSE OBJECT.MENU ITEM.ENABLE
  ObjectattPanel  FALSE OBJECT.MENU ITEM.ENABLE
  AlignObject   FALSE OBJECT.MENU ITEM.ENABLE
  ObjectsView...  FALSE OBJECT.MENU ITEM.ENABLE
  ObjectForm    FALSE OBJECT.MENU ITEM.ENABLE
  IsaacFlags    FALSE OBJECT.MENU ITEM.ENABLE
ELSE
  1
  25 202 ResString        \ " Redesign Object..."
  OBJECT.MENU SET.ITEMS
  SkinTree     TRUE OBJECT.MENU ITEM.ENABLE
  ObjectPosPanel  TRUE OBJECT.MENU ITEM.ENABLE
  ObjectattPanel  TRUE OBJECT.MENU ITEM.ENABLE
  AlignObject   TRUE OBJECT.MENU ITEM.ENABLE
  ObjectsView...  TRUE OBJECT.MENU ITEM.ENABLE
    ObjectForm    TRUE OBJECT.MENU ITEM.ENABLE
  IsaacFlags    TRUE OBJECT.MENU ITEM.ENABLE
THEN
THEN ;

find SETUP.OBJECT.MENU ' ^SETUP.OBJECT.MENU !


: INIT.OBJECT
  0
  26 202 ResString        \ " Object "
  OBJECT.MENU NEW.MENU
    27 202 ResString        \ " Redesign Object.../R;Create Skin Object;-("
  OBJECT.MENU APPEND.ITEMS
  28 202 ResString        \ " Object Position.../W;Object Attitude.../E;-("
  OBJECT.MENU APPEND.ITEMS
  29 202 ResString        \ " Align Object;Object's View "
  OBJECT.MENU APPEND.ITEMS
  35 202 ResString        \ -(;Rulers...;Attitude Grid...;Object Form...;Isaac Flags...;-(
  OBJECT.MENU APPEND.ITEMS
  31 202 ResString        \ " Use Draw Grid;Polar Grid;Show Rulers"
  OBJECT.MENU APPEND.ITEMS
  ^InitXEditorMenu execute ;

create object.view 1 ,


: OBJECT.MENU.OFF
  IN.OBJECT.DRAWING @ IF
    EditObject    TRUE  OBJECT.MENU ITEM.ENABLE
    1
    32 202 ResString        \ " Return to World..."
    OBJECT.MENU SET.ITEMS
      SkinTree    FALSE OBJECT.MENU ITEM.ENABLE
      ObjectPosPanel  FALSE OBJECT.MENU ITEM.ENABLE
    ObjectattPanel  FALSE OBJECT.MENU ITEM.ENABLE
    AlignObject   FALSE OBJECT.MENU ITEM.ENABLE
    ObjectsView...  FALSE OBJECT.MENU ITEM.ENABLE
      PosRulers     TRUE  OBJECT.MENU ITEM.ENABLE
      AttitudeGrid    FALSE OBJECT.MENU ITEM.ENABLE
      ObjectForm    FALSE OBJECT.MENU ITEM.ENABLE
    IsaacFlags    FALSE OBJECT.MENU ITEM.ENABLE
      DrawGrid      TRUE  OBJECT.MENU ITEM.ENABLE
```

```
    PolarGrid      TRUE  OBJECT.MENU ITEM.ENABLE
    UseRulers      TRUE  OBJECT.MENU ITEM.ENABLE
 ELSE
   0 FALSE OBJECT.MENU ITEM.ENABLE
 THEN ;

: OBJECT.MENU.ON
   0 TRUE OBJECT.MENU ITEM.ENABLE
   EditObject     TRUE  OBJECT.MENU ITEM.ENABLE
   1
   25 202 ResString        \ " Redesign Object..."
   OBJECT.MENU SET.ITEMS
   SkinTree     TRUE  OBJECT.MENU ITEM.ENABLE
     ObjectPosPanel  TRUE  OBJECT.MENU ITEM.ENABLE
   ObjectattPanel  TRUE  OBJECT.MENU ITEM.ENABLE
   AlignObject   TRUE  OBJECT.MENU ITEM.ENABLE
   ObjectsView...  TRUE  OBJECT.MENU ITEM.ENABLE
     PosRulers      TRUE  OBJECT.MENU ITEM.ENABLE
     AttitudeGrid     TRUE  OBJECT.MENU ITEM.ENABLE
     ObjectForm     TRUE  OBJECT.MENU ITEM.ENABLE
   IsaacFlags     TRUE  OBJECT.MENU ITEM.ENABLE
     DrawGrid       FALSE  OBJECT.MENU ITEM.ENABLE
     PolarGrid      FALSE  OBJECT.MENU ITEM.ENABLE
     UseRulers      FALSE  OBJECT.MENU ITEM.ENABLE
     ;

: TOGGLE.2GRID
  USE.GRID? @ IF
    0 USE.GRID? !
    DrawGrid FALSE OBJECT.MENU ITEM.CHECK
  ELSE
    -1 USE.GRID? !
    DrawGrid TRUE OBJECT.MENU ITEM.CHECK
  THEN ;

: TOGGLE.POLAR
  POLAR? @ IF
    0 POLAR? !
    PolarGrid  FALSE OBJECT.MENU ITEM.CHECK
  ELSE
    -1 POLAR? !
    PolarGrid TRUE OBJECT.MENU ITEM.CHECK
  THEN
  IN.OBJECT.DRAWING @ IF
    CURRENT.QUAD @ >R
    SAVE.CLIP >R
    current.point @ >R
    current.cpoint @ >R
    DISPLAY.QUADS
    R> CURRENT.CPOINT !
    R> CURRENT.POINT !
    R> RESTORE.CLIP
    R> CURRENT.QUAD !
  THEN  ;

: TOGGLE.RULERS
  RULERS?  IF
    0 to RULERS?
    UseRulers  FALSE OBJECT.MENU ITEM.CHECK
  ELSE
    -1 to RULERS?
```

```
    UseRulers TRUE OBJECT.MENU ITEM.CHECK
  THEN
  IN.OBJECT.DRAWING @ IF
    CURRENT.QUAD @ >R
    SAVE.CLIP >R
    current.point @ >R
    current.cpoint @ >R
    DISPLAY.QUADS
    R> CURRENT.CPOINT !
    R> CURRENT.POINT !
    R> RESTORE.CLIP
    R> CURRENT.QUAD !
  THEN  ;


: OBJECT.MENU.SELECT
  OBJECT.MENU MENU.SELECTION:
   CASE
  EditObject  OF
    DO.OBJECT.EDIT.MENU ENDOF
  SkinTree  OF
    SKIN.TREE
    DISPLAY.WORLD  ENDOF
  ObjectPosPanel    OF
    CURRENT.OBJECT @
    WORLD.OBJECT = NOT IF
      OPEN.OBJECT.POS.WINDOW
    THEN  ENDOF
  ObjectAttPanel    OF
    CURRENT.OBJECT @
    WORLD.OBJECT = NOT IF
      OPEN.OBJECT.Att.WINDOW
    THEN  ENDOF
    PosRulers     OF  DO.RULER.PANEL  ENDOF
  AttitudeGrid  OF  DO.ATT.PANEL  ENDOF
  ObjectForm    OF  DO.DESIGN.PANEL ENDOF
  IsaacFlags    OF  Do.Isaac.Flag.Panel ENDOF
  DrawGrid    OF  TOGGLE.2GRID  ENDOF
  PolarGrid     OF  TOGGLE.POLAR  ENDOF
  UseRulers     OF  TOGGLE.RULERS   ENDOF
  ENDCASE
 UseRulers - ^HandleXEditorMenu execute
 0 HILITE.MENU  ;


16 CONSTANT OBJECT.VIEW.MENU

 : INIT.OBJECT.VIEW
   -1
   26 202 ResString        \ " Object "
   OBJECT.VIEW.MENU NEW.MENU
   33 202 ResString        \ " Front;Back;Left;Right;Top;Bottom"
     OBJECT.VIEW.MENU APPEND.ITEMS ;


 : OBJECT.VIEW.MENU.SELECT
     OBJECT.VIEW.MENU MENU.SELECTION:
       CASE
   1   OF
     FRONT.COS COSINES COS.LENGTH CMOVE
     TWEEN.TO.OBJECT.VIEW ENDOF
       2   OF
     BACK.COS COSINES COS.LENGTH CMOVE
```

```
      TWEEN.TO.OBJECT.VIEW ENDOF
        3   OF
      LEFT.COS COSINES COS.LENGTH CMOVE
      TWEEN.TO.OBJECT.VIEW ENDOF
        4   OF
      RIGHT.COS COSINES COS.LENGTH CMOVE
      TWEEN.TO.OBJECT.VIEW ENDOF
        5     OF
      TOP.COS COSINES COS.LENGTH CMOVE
      TWEEN.TO.OBJECT.VIEW ENDOF
        6   OF
      BOTTOM.COS COSINES COS.LENGTH CMOVE
      TWEEN.TO.OBJECT.VIEW ENDOF
  ENDCASE
  0 HILITE.MENU  ;

18 CONSTANT OBJECT.ALIGNMENT

  : INIT.OBJECT.ALIGNMENT
    -1
    26 202 ResString         . " Object "
    OBJECT.ALIGNMENT NEW.MENU
    34 202 ResString         . " Align All;Align Attitude;Align Position"
      OBJECT.ALIGNMENT APPEND.ITEMS
    OBJECT.ALIGNMENT MENU.SELECTION:
        CASE
    1   OF
      "UNDO.MOVE SET.UNDOS             \ save undo state
        MARK.CHANGE
      0 0 0 OBJECT.R3POS PLACE
      0 YAW 0 PITCH 0 ROL
      COSINES OBJECT.RCOS MOVE.RECORD
      GET.OBJECT
      OBJECT.CHANGED
      REDRAW.OBJECT
      DISPLAY.WORLD ENDOF
        2   OF
      "UNDO.MOVE SET.UNDOS             \ save undo state
        MARK.CHANGE
      0 YAW 0 PITCH 0 ROL
      COSINES OBJECT.RCOS MOVE.RECORD
      GET.OBJECT
      OBJECT.CHANGED
      REDRAW.OBJECT
      DISPLAY.WORLD ENDOF
        3   OF
      "UNDO.MOVE SET.UNDOS             \ save undo state
        MARK.CHANGE
      0 0 0 OBJECT.R3POS PLACE
      GET.OBJECT
      OBJECT.CHANGED
      REDRAW.OBJECT
      DISPLAY.WORLD ENDOF
     ENDCASE
     0 HILITE.MENU  ;


   : INSTALL.OBJECT.MENU
     INIT.OBJECT
     OBJECT.MENU.SELECT
     INIT.OBJECT.VIEW
     OBJECT.VIEW.MENU.SELECT
     INIT.OBJECT.ALIGNMENT
     OBJECT.VIEW.MENU ObjectsView...
```

```
OBJECT.MENU Install.Hier
OBJECT.ALIGNMENT AlignObject
OBJECT.MENU Install.Hier ;
```

```
\ POSITION PANEL FOR SWIVEL, WITH DRAWN INDICATIONS OF RELATIVE POSITION
\ Last Revision: 01/28/88 10:05:48 PM   YH

anew position.edit.stuff

NEW.WINDOW OBJECT.POS.WINDOW              \ define new window for modeless dialog

cr ." Loading Object Position Panel..."

8100  NEW.DIALOG.RECORD                   \ define record to match DLOG 8100

  1   MAKE.ACTIVE.ITEM  OBJECT.POS.OK
  2   MAKE.ACTIVE.ITEM  OBJECT.POS.CANCEL
  3   MAKE.TEXT.ITEM    OBJECT.POS.X
  4   MAKE.TEXT.ITEM    OBJECT.POS.Y
  5   MAKE.TEXT.ITEM    OBJECT.POS.Z
  6   MAKE.TEXT.ITEM    OBJECT.POS.X.MIN
  7 MAKE.TEXT.ITEM    OBJECT.POS.X.MAX
  8 MAKE.TEXT.ITEM    OBJECT.POS.Y.MIN
  9 MAKE.TEXT.ITEM    OBJECT.POS.Y.MAX
  10  MAKE.TEXT.ITEM    OBJECT.POS.Z.MIN
  11  MAKE.TEXT.ITEM    OBJECT.POS.Z.MAX
  12  MAKE.CHECK.ITEM   OBJECT.X.LOCK
  13  MAKE.CHECK.ITEM   OBJECT.Y.LOCK
  14  MAKE.CHECK.ITEM   OBJECT.Z.LOCK
  15  MAKE.CHECK.ITEM   OBJECT.POS.ABSOLUTE?
  16  MAKE.TEXT.ITEM    OBJECT.POS.SCALE

NAME.DIALOG.RECORD OBJECT.POS.PANEL

  0 OBJECT.POS.ABSOLUTE? !
  SCALE.RANGE 100 * CONSTANT PERCENT.SCALE


  : DRAW.POS.ARROWS
    17 34  56 164 WHITE PATTERN RECTANGLE
    OBJECT.POS.ABSOLUTE? @ IF
      ADRAW.POS.ARROWS
    ELSE
      RDRAW.POS.ARROWS
    THEN ;


: GET.OBJECT.POSITION                     \ fetches current.object to pane.
  GET.OBJECT
    OBJECT.POS.ABSOLUTE? @ IF                  \ which form of edit, absolute or relative
      OBJECT.A3POS PLUCK                  \ fetch absolute postion for absolute edit
    ELSE
      OBJECT.R3POS PLUCK                  \ relative position for relative edit
  THEN
    NEG OBJECT.POS.Z CLEAR.STRING FIXED>MEASURES!     \ z is negative, store as string
    OBJECT.POS.Y CLEAR.STRING FIXED>MEASURES!     \ store y in panel as string
    OBJECT.POS.X CLEAR.STRING FIXED>MEASURES!     \ store x in panel as string
  X.RANGE PLUCK                     \ fetch x range
  OBJECT.POS.X.MIN  CLEAR.STRING FIXED>MEASURES!
  OBJECT.POS.X.MAX  CLEAR.STRING FIXED>MEASURES!
  Y.RANGE PLUCK                     \ fetch y range
  OBJECT.POS.Y.MIN  CLEAR.STRING FIXED>MEASURES!
  OBJECT.POS.Y.MAX  CLEAR.STRING FIXED>MEASURES!
  Z.RANGE PLUCK                     \ fetch z range
  NEG OBJECT.POS.Z.MAX  CLEAR.STRING FIXED>MEASURES!
  NEG OBJECT.POS.Z.MIN  CLEAR.STRING FIXED>MEASURES!  \ fix, neg 02/10/88 08:34:05 AM   YH
  OBJECT.POS.ABSOLUTE? @ IF              \ check for absolute edit
```

```
    OBJECT.SCALE PLUCK                  \ fetch appropriate scale
  ELSE
    OBJECT.RSCALE PLUCK
THEN
>PERCENTAGE OBJECT.POS.SCALE CLEAR.STRING MEASURE>MEASURES!   \ store as string in panel
  LINK.TYPE  PLUCK
DUP Z.LOCK     AND IF 1 ELSE 0 THEN         \ test link.type and set booleans
  OBJECT.Z.LOCK !
DUP Y.LOCK     AND IF 1 ELSE 0 THEN
  OBJECT.Y.LOCK !
    X.LOCK     AND IF 1 ELSE 0 THEN
  OBJECT.X.LOCK ! ;


: PUT.OBJECT.POSITION                  \ put the panel variable back in current object
  MARK.CHANGE                   \ mark change for undo
  "UNDO.EDIT SET.UNDOS
  ITEM.CHANGED.OF OBJECT.POS.X @
  ITEM.CHANGED.OF OBJECT.POS.Y @ OR
  ITEM.CHANGED.OF OBJECT.POS.Z @ OR
  IF
    OBJECT.POS.X      MEASURES>FIXED           \ convert from string to fixed
      OBJECT.POS.Y      MEASURES>FIXED         \ for x , y and z
      OBJECT.POS.Z      MEASURES>FIXED  NEG      \ z is negative
    OBJECT.POS.ABSOLUTE? @ IF
        OBJECT.A3POS PLACE              \ store in absolute pos if editing absolute
      SET.RELATIVE                 \ set relative
      ELSE
        OBJECT.R3POS PLACE              \ store in relative if edit is relative
    THEN
    CHANGED.FLAG @ TREE.CHANGED OR
    CHANGED.FLAG !
    OBJECT.CHANGED
  THEN
  ITEM.CHANGED.OF OBJECT.POS.X.MAX @
  ITEM.CHANGED.OF OBJECT.POS.X.MIN @ OR
  IF
    OBJECT.POS.X.MAX MEASURES>FIXED
    OBJECT.POS.X.MIN MEASURES>FIXED
    X.RANGE PLACE
    OBJECT.CHANGED                 \ convert and store x range
  THEN
  ITEM.CHANGED.OF OBJECT.POS.Y.MAX @
  ITEM.CHANGED.OF OBJECT.POS.Y.MIN @ OR
  IF
    OBJECT.POS.Y.MAX MEASURES>FIXED
    OBJECT.POS.Y.MIN MEASURES>FIXED
    Y.RANGE PLACE
    OBJECT.CHANGED                 \ convert and store y range
  THEN
  ITEM.CHANGED.OF OBJECT.POS.Z.MAX @
  ITEM.CHANGED.OF OBJECT.POS.Z.MIN @ OR
  IF
    OBJECT.POS.Z.MIN MEASURES>FIXED NEG
    OBJECT.POS.Z.MAX MEASURES>FIXED NEG     \ fix, neg 02/10/88  08:34:05 AM   YH
    Z.RANGE PLACE               \ convert and store z range
    OBJECT.CHANGED                 \ convert and store y range
  THEN
  ITEM.CHANGED.OF OBJECT.POS.SCALE @ IF
    OBJECT.POS.SCALE  MEASURES>MEASURE      \ fetch the scale
      PERCENTAGE>
    OBJECT.POS.ABSOLUTE? @ IF
        OBJECT.SCALE PLACE            \ if editing abs, store in scale and
      SET.RELATIVE               \ set relative
```

```
    ELSE
      OBJECT.RSCALE PLACE          \ else store in relative
  THEN
  OBJECT.CHANGED
  CHANGED.FLAG @ TREE.CHANGED OR
  CHANGED.FLAG !
THEN
ITEM.CHANGED.OF OBJECT.Z.LOCK @
ITEM.CHANGED.OF OBJECT.Y.LOCK @ OR
ITEM.CHANGED.OF OBJECT.X.LOCK @ OR
IF
  LINK.TYPE PLUCK ATT.LOCK AND         \ fetch the current link type, mask positions
      OBJECT.Z.LOCK @  IF Z.LOCK           \ test panel bools and set bits in link.type
    ELSE 0 THEN  OR
      OBJECT.Y.LOCK @  IF Y.LOCK
    ELSE 0 THEN  OR
      OBJECT.X.LOCK @  IF X.LOCK
    ELSE 0 THEN  OR
    LINK.TYPE PLACE
  OBJECT.CHANGED
THEN   ;


: DO.POS.CANCEL                  \ cancel current dialog
  LOCALS| C.ITEM HIT.ITEM C.RECORD |
   DROP 1                     \ drop the cancel and set ok to exit
  OBJECT.POS.WINDOW CLOSE.DIALOG            \ since this is modeless... close the window
  DROP DROP ;

    FIND DO.POS.CANCEL OBJECT.POS.CANCEL  !       \ set as token for cancel button


: DO.POS.OK                    \ save and exit current dialog
  LOCALS| C.ITEM HIT.ITEM C.RECORD
  OBJECT.POS.PANEL  GET.ITEM.DATA           \ fetch the data to the panel vars
  PUT.OBJECT.POSITION                  \ fetch the data from the panel vars to the current object
  OBJECT.POS.WINDOW CLOSE.DIALOG            \ since this is modeless... close the window
  DROP DROP ;

  FIND DO.POS.OK OBJECT.POS.OK !          \ set as token for ok button

: DO.POS.ABSOLUTE                \ handles absolute check box
   LOCALS| C.ITEM HIT.ITEM C.RECORD
     OBJECT.POS.PANEL  GET.ITEM.DATA        \ get the current data
   PUT.OBJECT.POSITION           \ save to the object
   C.RECORD HIT.ITEM C.ITEM
   ^HANDLE.CHECK EXECUTE             \ execute the check box handler
   GET.OBJECT.POSITION               \ now we have toggled the mode
   OBJECT.POS.PANEL SET.ITEMS           \ set the items
   DRAW.POS.ARROWS  ;              \ draw the arrows


  FIND DO.POS.ABSOLUTE ' OBJECT.POS.ABSOLUTE?   \ set the routine as the event handler for the check box
  ITEM.HANDLER.TOKEN + !


  : set.position.title
    0 SCRATCH.STRING c!
    OBJECT.STRING
    SCRATCH.STRING SWAP EX:
    +PHRASE
    14 203 ResString             \ "  . Position"
    SCRATCH.STRING +string
    SCRATCH.STRING OBJECT.POS.WINDOW
```

```
   SET.WTITLE  ;

 : UPDATE.OBJECT.POS.PANEL              \ update handler for dialog
    OBJECT.POS.WINDOW DRAW.DIALOG
   DRAW.POS.ARROWS ;


: DO.OBJECT.POS.PANEL                  \ main loop for dialog
   OBJECT.POS.PANEL
  CURRENT.OBJECT @
  LOCALS| C.OBJECT C.DIALOG
  IF OBJECT.POS.WINDOW DPUSH              \ push current dialog on a stack
    set.position.title
    GET.OBJECT.POSITION
      C.DIALOG GET.ITEMS               \ fetch item handles, rects
      C.DIALOG SET.ITEMS               \ set booleans, text
    DRAW.POS.ARROWS
     BEGIN                     \ start of event handling
    DO.EVENTS IN.CLOSE.BOX - IF            \ check for close
        C.DIALOG GET.ITEM.DATA           \ if  CLOSE fetch changes
        PUT.OBJECT.POSITION
        OBJECT.POS.WINDOW CLOSE.DIALOG
        DPOP DROP
      THEN
    ?KEYSTROKE IF
      CASE
        03 OF C.DIALOG GET.ITEM.DATA       \ if RETURN  fetch changes
          PUT.OBJECT.POSITION
          OBJECT.POS.WINDOW CLOSE.DIALOG
            DPOP DROP
        ENDOF
        13 OF  C.DIALOG GET.ITEM.DATA      \ if  ENTER fetch changes
          PUT.OBJECT.POSITION
          OBJECT.POS.WINDOW CLOSE.DIALOG
            DPOP DROP
        ENDOF
      ENDCASE
     THEN
    DIALOG.EVENT?                  \ check for dialog events
      IF SWAP DGET = IF              \ if dialog event check for current
      C.DIALOG HANDLE.ITEMS            \ if current handle items
      THEN
      ELSE 2DROP THEN               \ else drop dialog event args
    AGAIN                     \ endless loop until deactivated
   ELSE
    OBJECT.POS.WINDOW ?ACTIVE.WPTR IF
      C.DIALOG GET.ITEM.DATA            \ if deactivated fetch changes
      PUT.OBJECT.POSITION
      OBJECT.POS.WINDOW CLOSE.DIALOG
      DPOP DROP
    THEN
   THEN  ;


 : INIT.OBJECT.POS.WINDOW                \ set activates and updates
    OBJECT.POS.WINDOW ON.ACTIVATE DO.OBJECT.POS.PANEL
  OBJECT.POS.WINDOW ON.UPDATE UPDATE.OBJECT.POS.PANEL
  ;
```

```
: OPEN.OBJECT.POS.WINDOW                \ call to open the dialog
  8100 OBJECT.POS.WINDOW ADD.DIALOG   ;
```

```
\ scrap handling for swivel
\ Last Revision: 12/27/87  04:16:23 PM   YH


ANEW OBJECT.CLIPBOARD

cr ." Loading Object Scrap handling"


100 CONSTANT COMMENT.GLOBAL.KIND
 9 4* CONSTANT PIC.COMMENT.OFFSET

structure QDProcs
  LONG: +textProc
  LONG: +lineProc
  LONG: +rectProc
  LONG: +rRectProc
  LONG: +ovalProc
  LONG: +arcProc
  LONG: +polyProc
  LONG: +rgnProc
  LONG: +bitsProc
  LONG: +commentProc
  LONG: +txMeasProc
  LONG: +getPicProc
  LONG: +putPicProc
STRUCTURE.END


-102 CONSTANT WRONG.TYPE
-100 CONSTANT SCRAP.NOT.THERE

CREATE ROOT.SCRAP.OBJECT 0 ,
CREATE PICT.RECT 0 , 0 ,
CREATE ENCODE.SWIV? -1 ,
129 CONSTANT CURRENT.SWIZ.VERSION

\ SWIZ packing and unpacking


Structure SWIZ.HEADER
  LONG:  +SWIZ.SIZE
  SHORT: +SWIZ.ENTRIES
  SHORT: +SWIZ.VERSION
  LONG:  +SWIZ.RESERVED
STRUCTURE.END

GLOBAL CURRENT.SWIZ
0 TO CURRENT.SWIZ

GLOBAL SWIZ.POINTER
TOKEN.FOR DROP CONSTANT SWIZ.OPERATION


 : AddSWIZObject              \ current.SWIZ already holds enough memory
  CURRENT.SWIZ IF
    CURRENT.SWIZ HANDLE.SIZE 1+
    SWIZ.POINTER CURRENT.HANDLE HANDLE.SIZE + 4- > IF
      CURRENT.HANDLE HANDLE.SIZE 4-
      CURRENT.SWIZ @ SWIZ.POINTER + !
      CURRENT.HANDLE @
      CURRENT.SWIZ @ SWIZ.POINTER + 4-
      CURRENT.HANDLE HANDLE.SIZE
      CMOVE
```

```
    SWIZ.POINTER
    CURRENT.HANDLE HANDLE.SIZE 4- -
    TO SWIZ.POINTER
    CURRENT.SWIZ @ -SWIZ.ENTRIES W@ 1-
    CURRENT.SWIZ @ +SWIZ.ENTRIES W!
  ELSE
    10 SYSBEEP            \ raise all hell
    10 SYSBEEP
    10 SYSBEEP
    10 SYSBEEP
    10 SYSBEEP
  THEN
THEN ;


: TraverseSWIZ
 0 LOCALS| TEMP.HAND |
 CURRENT.SWIZ IF
   CURRENT.SWIZ HANDLE.SIZE
   CURRENT.SWIZ @ +SWIZ.SIZE @ = IF
     CURRENT.SWIZ LOCK.HANDLE
     SWIZ.HEADER TO SWIZ.POINTER
     CURRENT.SWIZ @ +SWIZ.ENTRIES W@ 0 DO
       ERROR.FLAG 0= IF
         CURRENT.SWIZ @ SWIZ.POINTER + @ 4-
         FROM.MIN.HEAP TO TEMP.HAND
         TEMP.HAND HANDLE.SIZE 0> IF
           CURRENT.SWIZ @ SWIZ.POINTER + 4+
           TEMP.HAND @
           CURRENT.SWIZ @ SWIZ.POINTER + @ 4-
           CMOVE
           TEMP.HAND SWIZ.OPERATION EXECUTE
         ELSE
           -108 TO ERROR.FLAG
         THEN
         TEMP.HAND TO.HEAP
       THEN
       CURRENT.SWIZ @ SWIZ.POINTER + @
       SWIZ.POINTER + TO SWIZ.POINTER
     LOOP
     CURRENT.SWIZ UNLOCK.HANDLE
   THEN
 THEN ;

: SWIZ.RECORD.SIZE
  SWIZ.POINTER
  CURRENT.HANDLE HANDLE.SIZE 4- -
  TO SWIZ.POINTER ;


: ALLOCATE.SWIZ.HANDLE
OPERATION @
CURRENT.RECORD @
LOCALS| C.RECORD C.OP |           \ save current operation and object as locals
CURRENT.SWIZ HANDLE.SIZE 0> IF
  CURRENT.SWIZ TO.HEAP
  0 TO CURRENT.SWIZ
THEN
SWIZ.HEADER TO SWIZ.POINTER
TOKEN.FOR  SWIZ.RECORD.SIZE OPERATION ! \ set object comment as the operation
TRAVERSE.DOWN.TREE              \ do the operation down the tree
C.RECORD SET.CURRENT.RECORD        \ restore previous state
C.OP OPERATION !
SWIZ.POINTER FROM.MIN.HEAP TO CURRENT.SWIZ
```

```
CURRENT.SWIZ HANDLE.SIZE SWIZ.POINTER = NOT IF
  0 TO CURRENT.SWIZ
  -108 TO ERROR.FLAG
ELSE
  CURRENT.SWIZ HANDLE.SIZE
  CURRENT.SWIZ @ +SWIZ.SIZE !
  CURRENT.SWIZ.VERSION CURRENT.SWIZ @ -SWIZ.VERSION W!
  0 CURRENT.SWIZ @ +SWIZ.RESERVED !
  0 CURRENT.SWIZ @ +SWIZ.ENTRIES W!
THEN ;


: TREE>SWIZ               \ write SWIZ for the tree
OPERATION @
CURRENT.RECORD @
LOCALS| C.RECORD C.OP |        \ save current operation and object as locals
ALLOCATE.SWIZ.HANDLE
CURRENT.SWIZ 0= NOT IF
  SWIZ.HEADER TO SWIZ.POINTER
  TOKEN.FOR AddSWIZObject OPERATION ! \ set object comment as the operation
  TRAVERSE.DOWN.TREE          \ do the operation down the tree
THEN
C.RECORD SET.CURRENT.RECORD       \ restore previous state
C.OP OPERATION !
ERROR.FLAG IF
  DO.ERROR.ALERT
  CURRENT.SWIZ HANDLE.SIZE 0> IF
    CURRENT.SWIZ TO.HEAP
    0 to CURRENT.SWIZ
  THEN
  0 TO CURRENT.SWIZ
THEN ;


: MAKE.OBJECT.PICT            \ write a pict from the current object
  0 LOCALS| C.PICT |          \ define locals
   ENTER.CURRENT.BACKPORT
   SET.TREE.BOUNDS           \ set the tree bounds
   BOUNDS.RECT @RECT          \ fetch the bounds rectangle
   POLY.CLIP                \ clip to window bounds
   SWAP 2SWAP SWAP 2SWAP         \ convert to TBLR
  PICT.RECT !RECT            \ place in pict.rect
    SAVE.CLIP >R
    PICT.RECT CLIP.RECT
    PICT.RECT OPEN.PICTURE
    TO C.PICT              \ open the picture
    PROCEDURAL? @ IF
      DRAW.TOOLBOX.TREE
    ELSE
      BACK.BITS            \ blit from itself to itself
      GET.WINDOW 2+
          PICT.RECT  DUP        \ use the calculated rect
        0 0 COPY.BITS         \ do the copy
    THEN
    CLOSE.PICTURE           \ close the picture
    R> RESTORE.CLIP
  EXIT.CURRENT.BACKPORT
  C.PICT ;


: SCRAP.ERROR                   \ handles scrap errors
  LOCALS| SCRAP.ERROR
```

```
SCRAP.ERROR CASE
  WRONG.TYPE OF 10 SYSBEEP ENDOF          \ wrong type of object on stack
  SCRAP.NOT.THERE OF 10 SYSBEEP ENDOF
ENDCASE ;

: COPY.SCRAP.PICT                       \ copy function for object.scrap
 0 0 LOCALS| SCRAP.RESULT C.PICT
  MAKE.OBJECT.PICT TO C.PICT               \ make the picture
  SCRAP.FLAG @ 0=                        \ if no scrap error
  C.PICT HANDLE.SIZE 1 > AND               \ and the handle is valid
  ERROR.FLAG -1 > AND  IF                  \ and no error has occured
    C.PICT LOCK.HANDLE                   \ lock the handle
      C.PICT @ C.PICT HANDLE.SIZE             \ pointer, size, type
      "PICT PUT.SCRAP TO SCRAP.RESULT           \ put in scrap
    SCRAP.RESULT 0 < IF
      SCRAP.RESULT 0 MAX
      TO ERROR.FLAG
      10 SYSBEEP
    THEN
    C.PICT UNLOCK.HANDLE                 \ unlock the handle
    C.PICT DISPOSE.PICTURE                 \ release the memory
  THEN ;

 : COPY.SCRAP.SWIZ                      \ copy function for object.scrap
 0 LOCALS| SCRAP.RESULT  |
  TREE>SWIZ
  CURRENT.SWIZ 0= not                     \ if the handle is valid
  ERROR.FLAG 0= AND  IF                    \ and no error has occured
    CURRENT.SWIZ LOCK.HANDLE               \ lock the handle
      CURRENT.SWIZ @
    CURRENT.SWIZ HANDLE.SIZE               \ pointer, size, type
      ASCII SWIZ
    PUT.SCRAP TO SCRAP.RESULT                \ put in scrap
    SCRAP.RESULT 0 < IF
      SCRAP.RESULT 0 MAX
      TO ERROR.FLAG
      10 SYSBEEP
    THEN
    CURRENT.SWIZ UNLOCK.HANDLE               \ unlock the handle
    CURRENT.SWIZ TO.HEAP                 \ release the memory
    0 TO CURRENT.SWIZ
  THEN ;

: COPY.OBJECT.SCRAP
  SCRAP.FLAG OFF                       \ set scrap error flag to zero
    0 TO ERROR.FLAG                     \ set global error to zero
    ZERO.SCRAP DROP                     \ zero the scrap
  COPY.SCRAP.PICT
  ERROR.FLAG 0=
  ENCODE.SWIV? @ AND IF
    COPY.SCRAP.SWIZ
  THEN
  ERROR.FLAG IF
    DO.ERROR.ALERT
  THEN ;

: CUT.OBJECT.SCRAP
   COPY.OBJECT.SCRAP
   DELETE.OBJECT ;
```

```
: INIT.TREE.COLOR
  RES.STATE PLUCK IF
  OPERATION @ >R
  ^SET.OBJECT.COLOR.INDEX  OPERATION !
   TRAVERSE.DOWN.TREE
  R> OPERATION !
 THEN  ;

: UPDATE.132.OBJECT
  CURRENT.KEY @  LOCALS| C.KEY |
  OBJECT.SCALE PLUCK SCALE.RANGE 256 */ OBJECT.SCALE PLACE
  OBJECT.RSCALE PLUCK SCALE.RANGE 256 */ OBJECT.RSCALE PLACE
  KEY.MAX 0 DO
    OBJECT.ATTRIBUTES1 DROP
    I  KEY.FRAME.RECORD * + KEY.SCALE @
    SCALE.RANGE 256 */
    OBJECT.ATTRIBUTES1 DROP
    I  KEY.FRAME.RECORD * + KEY.SCALE !
  LOOP
  132 OBJECT.VERSION PLACE
  C.KEY  CURRENT.KEY !  ;


: TEST.OBJECT.VERSION
  OBJECT.VERSION PLUCK 132 < IF
    UPDATE.132.OBJECT
  THEN  ;


: CLONE.SCRAP.SIZED                    \ clones variable sized object
  0 0 LOCALS| N.SIZE C.SIZE CLONE C.HANDLE |       \ declare locals
  C.HANDLE HANDLE.SIZE  TO N.SIZE          \ set new size of clone
  CLONE SET.CURRENT.OBJECT               \ set clone as current
  SIZE.OF.CURRENT.RECORD TO C.SIZE         \ c.size is clone old size
  N.SIZE C.SIZE  = NOT IF                \ if they are not equal ...
    N.SIZE RESIZE.RES.RECORD             \ resize the clone
    0= IF
       DELETE.RES.RECORD                 \ if unsuccessful then
       0 SET.CURRENT.RECORD              \ set result to 0
       -108 TO ERROR.FLAG               \ set error flag
    THEN
  THEN
  CURRENT.RECORD @ 0 = NOT IF              \ if succesful sizing
    C.HANDLE @
    CLONE SET.CURRENT.RECORD             \ set clone to current
    OBJECT.RECORD MOVE.RECORD              \ move the record
    PATCH.OBJECT.NAME
    TEST.OBJECT.VERSION
  THEN ;


 : CLONE.SCRAP.OBJECT                   \ handle -- duplicates
   CURRENT.OBJECT @
 0 LOCALS| THE.CLONE C.OBJECT C.HANDLE
 ERROR.FLAG -1 > IF
     GET.NEXT.OBJECT                  \ get a new object
     CURRENT.OBJECT @ TO THE.CLONE
   THE.CLONE WORLD.OBJECT > IF             \ if no memory error
       C.HANDLE
     THE.CLONE
     CLONE.SCRAP.SIZED                 \ move object info to new object
     ERROR.FLAG  0 < IF
       0 TO THE.CLONE
     THEN
```

```
    ROOT.SCRAP.OBJECT @ 0 - IF
      THE.CLONE ROOT.SCRAP.OBJECT !        \ if first object, set as root
    THEN
    ELSE
      -108 TO ERROR.FLAG              \ if can't resize, set error
    0 TO THE.CLONE
  THEN
THEN
THE.CLONE
C.HANDLE @  ' OBJECT.INDEX @ - W@           \ offset to index
 0 MAX LAST.OBJECT MIN                \ clip index
 4* DUP.LIST + !                  \ place clone's id in dup.list
C.OBJECT SET.CURRENT.OBJECT  ;


0 CONSTANT ^UNPASTE


: UNPASTE
  UN.UN.OBJECT @
  UN.OBJECT @ LOCALS| U.OBJECT UU.OBJECT
  UU.OBJECT UN.OBJECT !
  UN.DELETE.OBJECT
  U.OBJECT  UN.OBJECT !
  (DELETE.OBJECT)
  ^UNPASTE UNDO.TOKEN !
  UU.OBJECT UN.OBJECT !
  U.OBJECT UN.UN.OBJECT !
  "UNDO.PASTE SET.UNDOS  ;

  FIND UNPASTE ' ^UNPASTE !


: INSERT.SCRAP.OBJECT
  LOCALS|  TARGET.OBJECT SCRAP.OBJECT
  TARGET.OBJECT WORLD.OBJECT >
  TARGET.OBJECT LAST.OBJECT < AND IF
    TARGET.OBJECT SET.CURRENT.OBJECT
    RES.STATE PLUCK 0 >
    OBJECT.APP PLUCK "SWVL - AND IF
      OBJECT.R3POS PLUCK
      OBJECT.RSCALE PLUCK
      OBJECT.RCOS PLUCK
      UP.TREE PLUCK
      RIGHT.TREE PLUCK
      LEFT.TREE PLUCK
      LINK.TYPE PLUCK
      YAW.RANGE PLUCK
      PITCH.RANGE PLUCK
        ROL.RANGE PLUCK
      X.RANGE PLUCK
      Y.RANGE PLUCK
      Z.RANGE PLUCK
      OBJECT.ATTRIBUTES1 DROP
      SCRAP.OBJECT SET.CURRENT.OBJECT
      OBJECT.ATTRIBUTES1 MOVE.RECORD
      Z.RANGE PLACE
      Y.RANGE PLACE
      X.RANGE PLACE
      ROL.RANGE PLACE
      PITCH.RANGE PLACE
      YAW.RANGE PLACE
      LINK.TYPE PLACE
      LEFT.TREE PLACE
```

```
    RIGHT.TREE PLACE
    UP.TREE PLACE
    OBJECT.RCOS PLACE
    OBJECT.RSCALE PLACE
    OBJECT.R3POS PLACE
    INSERT.OBJECT
    INIT.TREE.COLOR
    DRAW.TREE
    TARGET.OBJECT SET.CURRENT.OBJECT
    DELETE.OBJECT
    SCRAP.OBJECT SET.CURRENT.OBJECT
    TARGET.OBJECT UN.UN.OBJECT !
    SCRAP.OBJECT UN.OBJECT !
    ^UNPASTE UNDO.TOKEN !
    "UNDO.PASTE SET.UNDO$
  ELSE
    WORLD.OBJECT TO TARGET.OBJECT
  THEN
THEN
TARGET.OBJECT WORLD.OBJECT = IF
  SCRAP.OBJECT SET.CURRENT.OBJECT
  THE.END  RIGHT.TREE PLACE               \ set defaults for head object
    THE.END  LEFT.TREE PLACE
    WORLD.OBJECT UP.TREE PLACE
  ALL.FREE LINK.TYPE PLACE                \ set default link and range
  10000 -10000 0 INTEGER>FIX DROP
  2DUP X.RANGE PLACE
  2DUP Y.RANGE PLACE
   Z.RANGE PLACE
  FULL.ANGLE 2/ DUP NEG
  2DUP YAW.RANGE PLACE
  2DUP PITCH.RANGE PLACE
   ROL.RANGE PLACE
    INSERT.OBJECT
  SCRAP.OBJECT UN.OBJECT !
  ^DELETE.OBJECT UNDO.TOKEN !
  "UNDO.PASTE SET.UNDOS
  0 0 0 OBJECT.A3POS PLACE
  SET.RELATIVE
  INIT.TREE.COLOR
  DRAW.TREE
 THEN  ;


: GET.SWIZ.SCRAP
  0 LOCALS| SCRAP.RESULT |
  0 FROM.MIN.HEAP TO CURRENT.SWIZ            \ get a handle
    CURRENT.SWIZ 0 = NOT IF              \ if handle is good...
      CURRENT.SWIZ
      ASCII SWIZ GET.SCRAP            \ fetch the scrap
      TO SCRAP.RESULT
      SCRAP.RESULT -1 > IF            \ if no scrap errors
        CURRENT.SWIZ @ +SWIZ.VERSION W@
        CURRENT.SWIZ.VERSION > IF
          5  201 ResString          \ " The scrap version "
          "" "" "" 401 issuealert drop
        ELSE
          TOKEN.FOR CLONE.SCRAP.OBJECT
          ' SWIZ.OPERATION !
          CLEAR.DUP.LIST              \ clear the dup list for cloning
          TRAVERSESWIZ
        THEN
          ELSE
        SCRAP.RESULT
```

```
      0 MAX TO ERROR.FLAG
      10 SYSBEEP                     \ if scrap errors, handle errors
      CURRENT.SWIZ TO.HEAP
      0 TO CURRENT.SWIZ
    THEN
    CURRENT.SWIZ TO.HEAP              \ return the handle
    0 TO CURRENT.SWIZ
  THEN ;

: PASTE.OBJECT.SCRAP
  CURRENT.OBJECT @                  \ save current object
  LOCALS| C.OBJECT |
  0 ROOT.SCRAP.OBJECT !                 \ zero root object
  0 TO ERROR.FLAG                   \ set error to none
  CLEAR.MOVING                     \ clear moving objects
  RESET.UNDO
  GET.SWIZ.SCRAP                    \ clone the objects
  ROOT.SCRAP.OBJECT @ 0 = NOT IF          \ if scrap contained swiv info...
    ROOT.SCRAP.OBJECT @
    SET.CURRENT.OBJECT                \ set root scrap object as current
    RES.STATE PLUCK IF                \ if it is active ...
      RECONCILE.TREE                \ fix-up the indexes in the tree
      CURRENT.OBJECT @ C.OBJECT          \ scrap , target
      INSERT.SCRAP.OBJECT             \ insert the scrap object
      ROOT.SCRAP.OBJECT @             \ set as current
      TO C.OBJECT
    THEN
  THEN
  ERROR.FLAG NO.ERROR < IF
    DO.ERROR.ALERT
    0 TO ERROR.FLAG
  THEN
  C.OBJECT SET.CURRENT.OBJECT
  DISPLAY.WORLD.OUTPUT   ;          \ display the image
```

```
\ TWEENING OPTIONS

cr ." Loading Options.Panel..."

\ ANEW OPTION.DIALOG

    5005 NEW.DIALOG.RECORD

  1 MAKE.ACTIVE.ITEM  OPTION.OK
  2 MAKE.CHECK.ITEM   OPTION.PAINT
  3 MAKE.CHECK.ITEM   OPTION.SCRAP
  4 MAKE.CHECK.ITEM   OPTION.PICS
  5 MAKE.CHECK.ITEM   OPTION.OBJECT.VIEW
  6 MAKE.CHECK.ITEM   OPTION.SMOOTH.PATH
  7 MAKE.TEXT.ITEM  OPTION.EASE.IN
  8 MAKE.TEXT.ITEM  OPTION.EASE.OUT

  NAME.DIALOG.RECORD OPTION.PANEL


  : SET.OPTION.PANEL
    OPTION.BITS @ OPTION.PAINT.BIT AND IF
       1 OPTION.PAINT !
    ELSE
       0 OPTION.PAINT !
    THEN
    OPTION.BITS @ OPTION.VIEW.BIT AND IF
       1 OPTION.OBJECT.VIEW !
    ELSE
       0 OPTION.OBJECT.VIEW !
    THEN
    OPTION.BITS @ OPTION.SCRAP.BIT AND IF
       1 OPTION.SCRAP !
    ELSE
       0 OPTION.SCRAP !
    THEN
    OPTION.BITS @ OPTION.PICS.BIT AND IF
       1 OPTION.PICS !
    ELSE
       0 OPTION.PICS !
    THEN
    USE.BEZIER.PATH @ OPTION.SMOOTH.PATH !
    EASE.IN @ OPTION.EASE.IN CLEAR.STRING  #>S!
    EASE.OUT @ OPTION.EASE.OUT CLEAR.STRING  #>S!   ;


  : GET.OPTION.PANEL
    0 OPTION.BITS !
    OPTION.PAINT @ IF
      OPTION.BITS @
      OPTION.PAINT.BIT +
      OPTION.BITS !
    THEN
    OPTION.OBJECT.VIEW @ IF
      OPTION.BITS @
      OPTION.VIEW.BIT +
      OPTION.BITS !
    THEN
    OPTION.SCRAP @ IF
      OPTION.BITS @
      OPTION.SCRAP.BIT +
      OPTION.BITS !
    THEN
    OPTION.PICS @ IF
```

```
  OPTION.BITS @
  OPTION.PICS.BIT +
  OPTION.BITS !
THEN
OPTION.SMOOTH.PATH @
USE.BEZIER.PATH !
OPTION.EASE.IN NNUMBER 0 MAX 100 MIN
EASE.IN !
OPTION.EASE.OUT NNUMBER 0 MAX 100 MIN
EASE.OUT !  ;

: DO.TWEEN.OPTIONS
  SET.OPTION.PANEL
  OPTION.PANEL HANDLE.DIALOG
  GET.OPTION.PANEL ;
```

```
\ generic output file stuff

cr ." Loading output file utils "

anew -outfileutils--


GLOBAL TEMP.REF#
GLOBAL FILECOUNT
0 TO FILECOUNT

: append.number
  pad clear.string #>$!
  pad APPEND.TITLE ;

: (AUTO.OPEN)
  0 LOCALS| THE.FILE |
  0 FILECOUNT append.number NEW.FILE TO THE.FILE
  FILECOUNT 1+ TO FILECOUNT
  THE.FILE ;

 : AUTO.OPEN
  0 LOCALS| THE.FILE |
  BEGIN
      (AUTO.OPEN) TO THE.FILE
    IO-RESULT @
     -48 = NOT
  UNTIL
  THE.FILE ;


  : NEW.TEMP.FILE                          \ TITLE PROMPT type -- FILE# or 0
  0 0 0 LOCALS| TEMP.FILE REF# FILE# FILE.TYPE FILE.STRING TITLE.STRING
  file.type DFLT.FILE.TYPE !
  IN.TWEEN? IF
    AUTO.OPEN TO TEMP.FILE
      IO-RESULT @ TO ERROR.FLAG
      ERROR.FLAG 0 < IF
        10 SYSBEEP
        0 TO temp.file
      THEN          \ post error if exists
      temp.file 0 > NOT IF
        0 TO temp.file
      THEN
   ELSE
    REPLY 74 ERASE                        \ clear reply
    75 75 XY>POINT                        \ screen.position
    file.string                         \ prompt
    Title.string
    REPLY (PUT.FILE)                      \ buffer and call (put.file)
    DISCARD.ACTIVATES  FRONT.WINDOW (WINDOW)          \ put away nicely
    0 TO temp.file
    0 TO TEMP.REF#
    REPLY C@ BOOLEAN                                    \ test for response
    IF                               \ if selected file
      REPLY 6+ <W@  TO REF#                   \ set local ref#
      IODIR OFF
      REF# VOLREF# !                      \ set one shot
      REPLY 10+ DELETES                   \ delete this file if it exists
      REF# VOLREF# !
      REF# TO TEMP.REF#
      IODIR OFF RW
      0 REPLY 10+ NEW.FILE TO temp.file           \ open a new file
      IO-RESULT @ TO ERROR.FLAG
```

```
    ERROR.FLAG 0 < IF
      DO.ERROR.ALERT
      0 TO temp.file
    THEN          \ post error if exists
    temp.file 0 > NOT IF
      0 TO temp.file
    THEN
  THEN
THEN
TEMP.FILE ;
```

```
\ OUTPUT PANEL

ANEW OUTPUT.DIALOG

605 MakeSwapOver DO.OUTPUT.PANEL

StartSwapOver

  8301 NEW.DIALOG.RECORD

  1 MAKE.ACTIVE.ITEM  OUTPUT.OK
  2 MAKE.ACTIVE.ITEM  OUTPUT.CANCEL
  3 MAKE.RADIO.ITEM   OUTPUT.PAINT
  4 MAKE.RADIO.ITEM   OUTPUT.DRAW
  5 MAKE.RADIO.ITEM   OUTPUT.PTNG
  6 MAKE.RADIO.ITEM   OUTPUT.DRAW.PICT
  7 MAKE.RADIO.ITEM   OUTPUT.PAINT.PICT
  8 MAKE.RADIO.ITEM   OUTPUT.EPS.PICT
  9 MAKE.RADIO.ITEM   OUTPUT.TEXT.INFO
   10 MAKE.RADIO.ITEM   OUTPUT.DXF
   11 MAKE.RADIO.ITEM   OUTPUT.ISAAC
   12 MAKE.RADIO.ITEM   OUTPUT.UN1
   13 MAKE.RADIO.ITEM   OUTPUT.UN2

 NAME.DIALOG.RECORD OUTPUT.PANEL


  1 ITEM.BANK.OF  OUTPUT.PTNG !
  1 ITEM.BANK.OF  OUTPUT.DRAW.PICT !
  1 ITEM.BANK.OF  OUTPUT.PAINT.PICT !
  1 ITEM.BANK.OF  OUTPUT.EPS.PICT !
  1 ITEM.BANK.OF  OUTPUT.TEXT.INFO !
  1 ITEM.BANK.OF  OUTPUT.DXF !
  1 ITEM.BANK.OF  OUTPUT.ISAAC !
  1 ITEM.BANK.OF  OUTPUT.UN1 !
  1 ITEM.BANK.OF  OUTPUT.UN2 !

 : PUT.OUTPUT.PANEL
    OUTPUT.PAINT @ IF
      0 PROCEDURAL? !
    ELSE
       -1 PROCEDURAL? !
    THEN
    OUTPUT.PTNG @      IF 1 TO FILE.STYLE THEN
    OUTPUT.DRAW.PICT @  IF 2 TO FILE.STYLE THEN
    OUTPUT.PAINT.PICT @ IF 3 TO FILE.STYLE THEN
    OUTPUT.EPS.PICT @   IF 4 TO FILE.STYLE THEN
    OUTPUT.TEXT.INFO @  IF 5 TO FILE.STYLE THEN
    OUTPUT.DXF @     IF 6 TO FILE.STYLE THEN
    OUTPUT.ISAAC @     IF 7 TO FILE.STYLE THEN
    OUTPUT.UN1 @     IF 8 TO FILE.STYLE THEN
    OUTPUT.UN2 @     IF 9 TO FILE.STYLE THEN
    ;


  : GET.OUTPUT.PANEL
  PROCEDURAL? @ IF
    1 OUTPUT.DRAW ! 0 OUTPUT.PAINT !
  ELSE
    0 OUTPUT.DRAW ! 1 OUTPUT.PAINT !
  THEN
  0 OUTPUT.PTNG !
  0 OUTPUT.DRAW.PICT !
```

```
0 OUTPUT.PAINT.PICT !
0 OUTPUT.EPS.PICT !
0 OUTPUT.TEXT.INFO !
FILE.STYLE CASE
  1 OF 1 OUTPUT.PTNG ! ENDOF
  2 OF 1 OUTPUT.DRAW.PICT ! ENDOF
  3 OF 1 OUTPUT.PAINT.PICT ! ENDOF
  4 OF 1 OUTPUT.EPS.PICT ! ENDOF
  5 OF 1 OUTPUT.TEXT.INFO ! ENDOF
  6 OF 1 OUTPUT.DXF ! ENDOF
  7 OF 1 OUTPUT.ISAAC ! ENDOF
  8 OF 1 OUTPUT.UN1 ! ENDOF
  9 OF 1 OUTPUT.UN2 ! ENDOF
ENDCASE ;

: O.BYE
  LOCALS| C.ITEM HIT.ITEM C.RECORD |
    DROP 1   ;

     FIND O.BYE OUTPUT.CANCEL !

: O.SAVE
  LOCALS| C.ITEM HIT.ITEM C.RECORD
  PUT.OUTPUT.PANEL ;

  FIND O.SAVE OUTPUT.OK !


: (DO.OUTPUT.PANEL)
   OUTPUT.PANEL
   LOCALS| C.DIALOG |
   0 LAST.RADIO.ITEM !          \ init radio global
   C.DIALOG DIALOG.OF INIT.DIALOG    \ open dialog window , push dialog.ptr onto.stack
   GET.OUTPUT.PANEL
   C.DIALOG GET.ITEMS           \ fetch item handles
   C.DIALOG SET.ITEMS           \ set booleans and text
   BEGIN
     DO.MODAL.DIALOG          \ handle modal events
       DUP C.DIALOG HANDLE.ITEMS   \ handle item events
   1 = UNTIL                \ until ok
   C.DIALOG GET.ITEM.DATA         \ fetch new data to record
     QUIT.DIALOG              \ end of dialog
  ;

SetSwapOverToken
EndSwapOver
```

```
\ overlay words

anew -overlay-

create CurrentOverlay 0 ,
create Maxhere  0 ,
create MaxToken 0 ,
create LastDp 0 ,
create LastLT 0 ,
create OverlayDp 0 ,
create OverlayLT 0 ,


Structure OverLayHeader
  Long:  +OverID
  Long:  +OverToken
  Long:  +OverHandle
  Long:  +MapHandle
  Long:  +OverObjectStart
  Long:  +OverTokenStart
Structure.End

: Load.Tokens
  0 locals| temp.token new.tokens the.token.tab
  new.tokens handle.size 4 / 0 do
    new.tokens @ I 4* + @
    next.ptr  +
    the.token.tab I 6 * - 2+ !
  loop ;


: LoadOverlay
  CurrentOverlay @ +OverHandle @ @
  CurrentOverlay @ +OverObjectStart @ next.ptr +
  CurrentOverlay @ +OverHandle @ handle.size cmove
  CurrentOverlay @ +OverTokenStart @ next.ptr +
  CurrentOverlay @ +MapHandle @ load.Tokens ;



: MakeSwapOver
  create
  here CurrentOverlay !
  ,              \ OverlayArray ID
  0 ,            \ starting token
  0 ,            \ the overlay handle
  0 ,            \ the map handle
  0 ,            \ OverObjectStart
  0 ,            \ CurrentToken
  does>
    CurrentOverlay !
    ascii SWVO
    CurrentOverlay @ +OverID @
    Get.Resource
    CurrentOverlay @ +OverHandle !
    CurrentOverlay @ +OverHandle @ 0> if
      ascii SWVM
      CurrentOverlay @ +OverID @
      Get.Resource
      CurrentOverlay @ +MapHandle !
      CurrentOverlay @ +MapHandle @ 0> if
        LoadOverlay
        CurrentOverlay @ +OverToken @ execute
        CurrentOverlay @ +MapHandle @ release.resource
```

```
      CurrentOverlay @ +OverHandle @ release.resource    \ send them away
    else
      true abort" Unable to find overlay"
    then
  else
    true abort" Unable to find overlay"
  then  ;


: Save.Tokens
  locals| new.tokens the.token.tab |
  new.tokens handle.size 4 / 0 do
    the.token.tab I 6 * - 2+ @
    next.ptr -
    new.tokens @ I 4 * + !
  loop ;


: StartSwapOver            \ starts an overlay compile
  OverlayDp @ 0=
  abort" You need to allocate the overlay first..."
    here LastDp !
    last.token @ LastLT !
    OverlayDp @ dp !
    OverlayLt @ last.token !
    OverlayDp @ dp !
    OverlayLt @ 6 - CurrentOverlay @ +OverTokenStart !
    OverlayDp @ next.ptr - CurrentOverlay @ +OverObjectStart !
    ;


: SetSwapOverToken
  Last.token @
  CurrentOverlay @ +OverToken ! ;


: Dispose.Overlay
  CurrentOverlay @ +OverID @
  0 locals| the.object the.id |
  ascii SWVO
  the.id
  Get.Resource to the.object
  the.object if
    the.object remove.resource
    the.object to.heap
    0 to the.object
  then
  ascii SWVM
  the.id
  Get.Resource to the.object
  the.object if
    the.object remove.resource
    the.object to.heap
    0 to the.object
  then
  UPDATE.RESOURCES ;


: MakeOverlayObject
  CurrentOverlay @ +OverID @
  0 locals| the.object the.id |
  Here next.ptr -
  CurrentOverlay @
  +OverObjectStart @ -
```

```
  from.heap to the.object
  the.object if
    CurrentOverlay @
    +OverObjectStart @ next.ptr -
    the.object @
    the.object handle.size cmove
    the.object
    ascii SWVO
    the.id
    ""
    Add.Resource
    the.object write.resource
    the.object detach.resource
    the.object to.heap
  else
    true abort" Unable to save overlay"
  then  ;

: MakeOverlayMap
  CurrentOverlay @ +OverID @
  0 locals| the.object the.id |
  CurrentOverlay @
  +OverTokenStart @
  last.token @ 6 - - abs 4* 6 /
  from.heap to the.object
  the.object if
    CurrentOverlay @
    +OverTokenStart @ next.ptr +
    the.object
    Save.Tokens
    the.object
    ascii SWVM
    the.id
    ""
    Add.Resource
    the.object write.resource
    the.object detach.resource
    the.object to.heap
  else
    true abort" Unable to save overlay"
  then   ;

: BeheadOverlay
  0 locals| the.token |
  last.token @ OverlayLt @ - abs 6 / 0 do
    OverlayLt @ i -6 * + 6 - to the.token
      the.token nfa if
      cr the.token nfa  ." pruning: " count type
      the.token behead
    then
  loop ;

: EndSwapOver               \ ends an overlay compile
  CurrentOverlay @ +OverID @
  0 locals| the.object the.id
  dispose.overlay
  last.token @  MaxToken @ > if
    here Maxhere @ < if
      MakeOverlayObject
      MakeOverlayMap
      UPDATE.RESOURCES
      BeheadOverlay
    else
```

```
    true abort" over object limit on overlay "
  then
else
  true abort" over token limit on overlay "
then
LastDp @ Dp !
LastLT @ Last.Token ! ;


: OverlayAllot
    locals| tokensize objectsize |
  force.tokens on
  here OverlayDp !
  last.token @ OverlayLt !
  last.token @ tokensize 6 * -
  dup last.token ! MaxToken !
  here objectsize + dup dp ! Maxhere !
  force.tokens off ;

15000 100 OverlayAllot
```

```
\ palette window

ANEW NEW.PAL4


 NEW.WINDOW PALETTE.WIN
 " PALETTE"            PALETTE.WIN  W.TITLE
 100 10 135 286        PALETTE.WIN  W.BOUNDS
 2              PALETTE.WIN  W.TYPE
 W/COLOR            PALETTE.WIN  W.ATTRIBUTES

\ constants for index rectangles

20 CONSTANT YINDEXOFF
10 CONSTANT XINDEXOFF
10 CONSTANT YINDEXHIGH
256 CONSTANT XINDEXWIDE
8 CONSTANT YINDEXSPACE
276 constant w.width

GLOBAL CURRENT.INDEX
GLOBAL LAST.INDEX
GLOBAL CURRENT.REFLECT
GLOBAL LAST.REFLECT


CREATE LAST.PALETTE.COLOR    0 W, 0 W, 0 W,
CREATE LAST.PALETTE.INDEX    0 ,

\ Undo for Palette

: Undo.Palette.Change                 \ undoes the change
  last.palette.index @
  RGB@INDEX
  LAST.PALETTE.COLOR @RGB
  last.palette.index @
  RGB!INDEX
  LAST.PALETTE.COLOR !RGB
  SWIV.COLORS>BACKGDEVICE
  BACKGDEVICE>PALETTE
  PALETTE.WIN SET.PALETTE.WINDOW
  GET.KEY.WORLD                       \ update any object.rgbcolors
  ;

 : MARK.PALETTE.CHANGE                   \ marks state for undo
  locals| THE.INDEX |
  THE.INDEX last.palette.index !
  THE.INDEX RGB@INDEX
  LAST.PALETTE.COLOR !RGB
  TOKEN.FOR Undo.Palette.Change
  UNDO.TOKEN !
  WORLD.OBJECT UN.OBJECT !
  "UNDO.PALETTE SET.UNDOS ;


 : SET.PALETTE.BOUNDS                 \ sets window bounds for palette
  0 LOCALS| W.HEIGHT THE.MOUSE
  256 Key.Color.Res @ /
  YINDEXHIGH YINDEXSPACE + *
  YINDEXOFF + TO W.HEIGHT
  THE.MOUSE local>global
  point>xy
  40 - 40 max
  SCREEN.BOUNDS 4- W@ W.HEIGHT - 5 - MIN
```

-000585

```
  PALETTE.WIN +wbounds W!
  w.width 2/ - 5 max
  SCREEN.BOUNDS 6+ W@ w.width - 5 - MIN
  PALETTE.WIN +wbounds 2+ W!
  PALETTE.WIN +wbounds  W@
  W.HEIGHT +
  PALETTE.WIN +wbounds 4+ W!
  PALETTE.WIN +wbounds 2+ W@ w.width +
  PALETTE.WIN +wbounds 6+ W!
  ;


: SET.INDEX.RECT                    \ sets rectangle for an index of colors
  0 0 LOCALS| INDEXX INDEXY THE.RECT THE.INDEX |
  THE.INDEX
  YINDEXHIGH YINDEXSPACE + *
  YINDEXOFF + TO INDEXY
  XINDEXOFF TO INDEXX
  INDEXX INDEXY INDEXX
  XINDEXWIDE + INDEXY  YINDEXHIGH +
  THE.RECT !RECT ;


: SET.COLOR.RECT                          \ sets a rectangle for one color
  0 0 LOCALS| INDEXX INDEXY THE.RECT THE.INDEX
  THE.INDEX  Key.Color.Res @ /
    YINDEXHIGH YINDEXSPACE + *
  YINDEXOFF + TO INDEXY
  THE.INDEX Key.Color.Res @  MOD
  256 Key.Color.Res @ / *
  XINDEXOFF +  TO INDEXX
  INDEXX INDEXY
  INDEXX 256 Key.Color.Res @ / +
  INDEXY  YINDEXHIGH +
  THE.RECT !RECT ;


: SHOW.PALETTE.COLOR
  0 0 0 0 LOCALS| MAP.RGB KEY.RGB THE.MAP THE.CLUT THE.INDEX    \ set locals
  BACK.GDEVICE @ @ +GDPMAP @  TO THE.MAP              \ find the gdevice pixmap
  THE.MAP @ +PMTABLE @ TO THE.CLUT                   \ find the gdevice clut
  1 1 PENSIZE
  8 PENMODE
  THE.INDEX TEMP.RECT SET.COLOR.RECT
  THE.CLUT @
  +ctTable                          \ address of spec array
  +csRGBColor
  THE.INDEX COLORSPEC * +                    \ address of index in array
  @RGB  TEMP.RGB !RGB
  TEMP.RGB RGBFORECOLOR
    TEMP.RECT @RECT BLACK PATTERN RECTANGLE
  BLACK.RGB RGBFORECOLOR ;


: HILITE.INDEX
  1 1 PENSIZE
  10 PENMODE
  TEMP.RECT SET.INDEX.RECT
  TEMP.RECT @RECT
  2+ SWAP 2+ SWAP 2SWAP
  2- SWAP 2- SWAP 2SWAP FRAME RECTANGLE ;
```

-000586

```
create palette.close 2 w, 4 w, 8 w, 10 w,

: draw.palette.top
  0 11 move.to
  1000 11 draw.to
  palette.close @rect
  swap 2swap swap 2swap
  frame rectangle
  15 2 move.to
  1000 2 draw.to
  15 4 move.to
  1000 4 draw.to
  15 6 move.to
  1000 6 draw.to
  15 8 move.to
  1000 8 draw.to ;

: track.rect
    -1 locals| in.flag the.rect
    the.rect (invert.rect)
    begin
      @mouse the.rect
      ptinrect if
        in.flag not if
          the.rect (invert.rect)
            -1 to in.flag
        then
      else
        in.flag if
          the.rect (invert.rect)
            0 to in.flag
        then
      then
    mouse.button not until
    in.flag if
      the.rect (invert.rect)
    then
    @mouse the.rect ptinrect ;


: HIT.PALETTE.INDEX                    \ point -- index or -1
  -1 LOCALS| THE.HIT THE.MOUSE
  256 Key.Color.Res @ /  0 DO            \ loop for the number of keys
    I  TEMP.RECT SET.INDEX.RECT
    TEMP.RECT @RECT SWAP 2SWAP SWAP 2SWAP
    TEMP.RECT !RECT
     THE.MOUSE TEMP.RECT PTINRECT IF
      I TO THE.HIT
    THEN
  LOOP
  THE.HIT ;


: @REFLECT
  LOCALS| THE.MOUSE |
  THE.MOUSE POINT>XY DROP
  XINDEXOFF - 100 * 256 /
  100 SWAP -
  ;

: HILIGHT.REFLECT
  0 0 LOCALS| RX RY THE.REFLECT
  10 PENMODE
```

-000587

```
 1 1 PENSIZE
 BLACK PENPAT
 THE.REFLECT 256 * 100 /
 256 SWAP -
 XINDEXOFF + TO RX
 CURRENT.INDEX
 YINDEXHIGH YINDEXSPACE + *
 YINDEXOFF +  TO RY
 RX RY 2 - MOVE.TO
 RX 5 - RY 7 - DRAW.TO
 RX 5 + RY 7 - DRAW.TO
 RX RY 2 - DRAW.TO ;

: UPDATE.NEW.PALETTE
 PAGE
 draw.palette.top
 256 0 DO                   \ loop for the number of keys
   I SHOW.PALETTE.COLOR          \ set this one index into the gdevice clut
 LOOP
 CURRENT.INDEX HILITE.INDEX
 CURRENT.REFLECT HILIGHT.REFLECT
 ;


: SET.EDIT.COLOR
 0 LOCALS| NORM THE.B THE.G THE.R
 CURRENT.REFLECT COLOR.SCALE 100 */
 TO NORM
 THE.R NORM COLOR.SCALE  */
 THE.G NORM COLOR.SCALE  */
 THE.B NORM COLOR.SCALE  */ ;


: GET.EDIT.COLOR
 0 LOCALS| NORM THE.B THE.G THE.R
 THE.B THE.G MAX THE.R MAX TO NORM
 THE.R COLOR.SCALE NORM */
 THE.G COLOR.SCALE NORM */
 THE.B COLOR.SCALE NORM */
 NORM 100 COLOR.SCALE */ TO CURRENT.REFLECT ;


: EDIT.INDEX
 LOCALS| THE.INDEX
     INIT.CURSOR                   \ arrow for picking
     THE.INDEX RGB@INDEX
   SET.EDIT.COLOR
     INCOLOR !RGB
     0 PROMPT INCOLOR OUTCOLOR COLORPICKER      \ picker
   IF
     THE.INDEX MARK.PALETTE.CHANGE
       OUTCOLOR @RGB
     GET.EDIT.COLOR
     THE.INDEX RGB!INDEX
     SWIV.COLORS>BACKGDEVICE
     BACKGDEVICE>PALETTE
     Get.Window
     SET.PALETTE.WINDOW
     GET.KEY.WORLD              \ update any object.rgbcolors
   THEN
   DISCARD.ACTIVATES ;

: =RGB
```

```
  LOCALS| R1 G1 B1 R2 G2 B2
  R1 R2 =
  G1 G2 = AND
  B1 B2 = AND ;

: put.palette
  CURRENT.OBJECT @ WORLD.OBJECT = IF
      OBJECT.PALETTE.INDEX PLUCK CURRENT.INDEX = NOT
      OBJECT.REFLECT PLUCK CURRENT.REFLECT = NOT OR IF
        MARK.CHANGE
        "UNDO.COLOR SET.UNDOS
        CURRENT.INDEX OBJECT.PALETTE.INDEX PLACE
        CURRENT.REFLECT OBJECT.REFLECT PLACE
        CURRENT.INDEX
        RGB@INDEX OBJECT.RGBCOLOR DROP !RGB
        CURRENT.OBJECT @ TREE.CHANGED + CHANGED.FLAG !
        set.direct
        OBJECT.CHANGED
      THEN
    ELSE
      OBJECT.PALETTE.INDEX PLUCK CURRENT.INDEX = NOT
      OBJECT.REFLECT PLUCK CURRENT.REFLECT = NOT OR IF
        MARK.CHANGE
        "UNDO.COLOR SET.UNDOS
        CURRENT.INDEX OBJECT.PALETTE.INDEX PLACE
        CURRENT.REFLECT OBJECT.REFLECT PLACE
        CURRENT.INDEX
        RGB@INDEX OBJECT.RGBCOLOR DROP !RGB
        CURRENT.OBJECT @ JUST.OBJECT.CHANGED + CHANGED.FLAG !
        set.direct
        OBJECT.CHANGED
      THEN
    THEN ;

: set.palette.globals
    OBJECT.REFLECT PLUCK TO CURRENT.REFLECT
    OBJECT.PALETTE.INDEX PLUCK TO CURRENT.INDEX
    current.index 256 Key.Color.Res @ / 1-  > if
      256 Key.Color.Res @ /  1-  dup
      OBJECT.PALETTE.INDEX PLACE
      to CURRENT.INDEX
      object.changed
    then ;

: do.new.palette
  0 LOCALS| THE.HIT
  IF
    WINDOW.REGION.EMPTY
    INIT.CURSOR
    set.palette.globals
    update.new.palette
    BEGIN
    DO.EVENTS
    DOUBLE.CLICK IF
    @MOUSE.DN HIT.PALETTE.INDEX TO THE.HIT
      THE.HIT 0 >
      MONOCHROME? NOT AND IF
        THE.HIT TO CURRENT.INDEX
        CURRENT.INDEX EDIT.INDEX
        WINDOW.REGION.EMPTY
        update.new.palette
      THEN
```

-000589

```
    THEN
    MOUSE.DOWN = IF
      @MOUSE.DN HIT.PALETTE.INDEX TO THE.HIT
      @MOUSE.DN PALETTE.CLOSE PTINRECT IF
        PALETTE.CLOSE TRACK.RECT IF
          PUT.PALETTE
          PALETTE.WIN CLOSE.WINDOW
        THEN
      ELSE
        THE.HIT -1 > IF
          CURRENT.INDEX TO LAST.INDEX
          CURRENT.REFLECT TO LAST.REFLECT
          LAST.REFLECT HILIGHT.REFLECT
          THE.HIT TO CURRENT.INDEX
          @MOUSE.DN @REFLECT TO CURRENT.REFLECT
          CURRENT.INDEX HILITE.INDEX
          LAST.INDEX HILITE.INDEX
          CURRENT.REFLECT HILIGHT.REFLECT
        ELSE
          >DRAG.WINDOW
        THEN
      THEN
    THEN
    AGAIN
  ELSE
    PALETTE.WIN ?ACTIVE.WPTR IF
      PUT.PALETTE
      PALETTE.WIN CLOSE.WINDOW
    THEN
  THEN
  ;


: init.palette.window
  PALETTE.WIN add.window
  PALETTE.WIN on.activate do.new.palette
  PALETTE.WIN on.update update.new.palette
  PALETTE.WIN SET.PALETTE.WINDOW ;


: DO.COLOR.PALETTE
  LOCALS| THE.MOUSE |
  THE.MOUSE  SET.PALETTE.BOUNDS
  init.palette.window ;
```

```
\ PALETTE.FILE.HANDLING

ANEW --PALETTE.FILES.1--

CR ." Loading Palette File Handling ... "
CR
ASCII SPal CONSTANT "SPal


: ATTACH.PALETTES
  MONOCHROME? LOCALS| MONO.STATE |
  -1 TO MONOCHROME?
  SWIV.COLORS @ "SPal 128         \ handle , type, index, name
  NIL.NAME ADD.RESOURCE
  0 TO MONOCHROME?
  SWIV.COLORS @ "SPal 129         \ handle , type, index, name
  NIL.NAME ADD.RESOURCE
  MONO.STATE TO MONOCHROME? ;


: GET.SWIV.CLUT              \ make sure we have a palette
  MONOCHROME?  0 0 LOCALS| THE.MONO THE.KEY MONO.STATE
  -1 TO MONOCHROME?
  SWIV.COLORS @ 0= IF
    ASCII clut 128 GET.RESOURCE TO THE.MONO
    RES.ERROR ?dup if
      TO ERROR.FLAG
    then
    THE.MONO IF
      THE.MONO DETACH.RESOURCE
      THE.MONO SWIV.COLORS !
    ELSE
      TRUE ABORT"  Unable to Load Default Palette"
      BYE
    THEN
  THEN
  0 TO MONOCHROME?
  SWIV.COLORS @ 0= IF
    ASCII clut 129 GET.RESOURCE TO THE.KEY
    RES.ERROR ?dup if
      TO ERROR.FLAG
    then
    THE.KEY IF
      THE.KEY DETACH.RESOURCE
      THE.KEY SWIV.COLORS !
    ELSE
      TRUE ABORT"  Unable to Load Default Palette"
      BYE
    THEN
  ATTACH.PALETTES
  THEN
  MONO.STATE TO MONOCHROME?  ;


: LOAD.PALETTES
  MONOCHROME?  0 0 LOCALS| THE.MONO THE.KEY MONO.STATE
  "SPal 128 GET1RESOURCE TO THE.MONO
  THE.MONO IF
    "SPal 129 GET1RESOURCE TO THE.KEY
    THE.KEY IF
      -1 TO MONOCHROME?
      THE.MONO SWIV.COLORS !
      0 TO MONOCHROME?
      THE.KEY SWIV.COLORS !
```

-000591

```
    ELSE
      0 SWIV.COLORS !
    THEN
  ELSE
    0 SWIV.COLORS !
    -1 TO MONOCHROME?
    0 SWIV.COLORS !
  THEN
  MONO.STATE TO MONOCHROME?
  GET.SWIV.CLUT ;

: DELETE.PALETTES
  MONOCHROME? LOCALS| MONO.STATE |
  -1 TO MONOCHROME?
   SWIV.COLORS @ IF
    SWIV.COLORS @ To.Heap
   THEN
   0 SWIV.COLORS !
   0 TO MONOCHROME?
   SWIV.COLORS @ IF
    SWIV.COLORS @ To.Heap
   THEN
   0 SWIV.COLORS !
   MONO.STATE TO MONOCHROME? ;


: DETACH.PALETTES
  MONOCHROME? LOCALS| MONO.STATE
  -1 TO MONOCHROME?
   SWIV.COLORS @ DETACH.RESOURCE
   0 TO MONOCHROME?
   SWIV.COLORS @ DETACH.RESOURCE
   MONO.STATE TO MONOCHROME? ;
```

```
ANEW PALETTE.DIALOG.1

608 MakeSwapOver DO.PALETTE.OPTIONS
StartSwapOver

  2964 NEW.DIALOG.RECORD

  1 MAKE.ACTIVE.ITEM  PAL.OK
  2 MAKE.ACTIVE.ITEM  PAL.CANCEL
  3 MAKE.RADIO.ITEM   PAL.1
  4 MAKE.RADIO.ITEM   PAL.2
  5 MAKE.RADIO.ITEM   PAL.4
  6 MAKE.RADIO.ITEM   PAL.8
  7 MAKE.RADIO.ITEM   PAL.16
    8 MAKE.TEXT.ITEM    PAL.SHADOW.RANGE

 NAME.DIALOG.RECORD PALETTE.OPTIONS


: ZERO.PALETTE.OPTIONS
  0 PAL.1 !
  0 PAL.2 !
  0 PAL.4 !
  0 PAL.8 !
  0 PAL.16 !
  ;


: GET.PALETTE.PANEL
  ZERO.PALETTE.OPTIONS
  MONOCHROME? IF
    1 PAL.1 !
  ELSE
    SWIV.COLORS @ @ +CTSIZE W@ EXI 1-
    CASE
      1 OF 1 PAL.1 ! ENDOF
      2 OF 1 PAL.2 ! ENDOF
      4 OF 1 PAL.4 ! ENDOF
      8 OF 1 PAL.8 ! ENDOF
      16 OF 1 PAL.16 ! ENDOF
    ENDCASE
  THEN
  SHADOW.SCALE
  100 * COLOR.SCALE 2/ + COLOR.SCALE /
    PAL.SHADOW.RANGE CLEAR.STRINC  #>S!
  ;


 : PUT.PALETTE.PANEL
  0 0 0 0 0 0 LOCALS| THE.OCONTRAST THE.CONTRAST THE.SHADE THE.MONO THE.COLOR THE.EFFECT
    PAL.1  @ IF -1 TO THE.MONO
           255 to THE.COLOR THEN
    PAL.2  @ IF  1 TO THE.COLOR THEN
    PAL.4  @ IF  3 TO THE.COLOR THEN
    PAL.8  @ IF  7 TO THE.COLOR THEN
    PAL.16 @ IF 15 TO THE.COLOR THEN

    PAL.SHADOW.RANGE NNUMBER . MAX 100 MIN
    COLOR.SCALE * 50 + 100 / TO THE.SHADE
    -1
```

-000593

I

6/1/90 20:03 PALETTE.OPTIONS Page 2

```
    MONOCHROME? THE.MONO = AND
    THE.COLOR SWIV.COLORS @ 3 +CTSIZE W@ = AND
    ITEM.CHANGED.OF PAL.SHADOW.RANGE @ NOT AND
    NOT IF
      THE.MONO to MONOCHROME?
      THE.COLOR SWIV.COLORS 3 @ +CTSIZE W!
      THE.SHADE ' SHADOW.SCALE !
      INIT.WINDOW.PALETTE
      SET.WORLD.PALETTE.INDEX
      SetMaterialsChanged        \ mark materials as changed
      WORLD.OBJECT SET.CURRENT.OBJECT
      REDRAW.OBJECT
    THEN
    ;

 : P.BYE
    LOCALS| C.ITEM HIT.ITEM C.RECORD
      DROP 1   ;

       FIND P.BYE PAL.CANCEL !

: PALETTE.SAVE
    LOCALS| C.ITEM HIT.ITEM C.RECORD
    PALETTE.OPTIONS GET.ITEM.DATA
    PUT.PALETTE.PANEL ;

    FIND PALETTE.SAVE PAL.OK !

: (DO.PALETTE.OPTIONS)
   PALETTE.OPTIONS
    LOCALS| C.DIALOG |
      0 LAST.RADIO.ITEM !          \ init radio global
      C.DIALOG DIALOG.OF INIT.DIALOG    \ open dialog window , push dialog.ptr on d.stack
      C.DIALOG GET.ITEMS           \ Fetch item handles
      GET.PALETTE.PANEL
      C.DIALOG SET.ITEMS           \ set booleans and text
      BEGIN
        DO.MODAL.DIALOG          \ handle modal events
          DUP C.DIALOG HANDLE.ITEMS   \ handle item events
      1 = UNTIL                \ until ok
      C.DIALOG GET.ITEM.DATA        \ fetch new data to record
        QUIT.DIALOG              \ end of dialog
    FLUSH.EVENTS ;

SetSwapOverToken
EndSwapOver

  FIND DO.PALETTE.OPTIONS ' ^DO.PALETTE.CLICKS !
```

6/1/90 20:03 patch slider Page 1

```
: nhandle.scale.control
  0 locals|  the.hit range.rect the.scale
  10 penmode
  the.scale
  range.rect
  set.scale.rect
  @mouse scale.rect ptinrect if
    draw.scale.indicator
    begin
      @mouse
      point>xy  drop
      the.scale
      range.rect
      set.scale.var
      the.scale
      range.rect
      set.scale.rect
      draw.scale.indicator
      move/unclick
      draw.scale.indicator
    mouse.button not until
    true to the.hit
    draw.scale.indicator
  then
  8 penmode
  the.hit ;


find nhandle.scale.control ' handle.scale.control W!

find (;) ' handle.scale.control 2+ W!
```

```
\ routines to check for
\ inside-out path objects
\ objects with front or back poly caps
\ objects which are open and solid have their backplanes drawn
\ Last Revision: 03/26/88  01:49:34 PM   YH

ANEW -PATH.CHECK--

cr ." Loading Path Object checking routines ... "


: CHECK.FRONT.CAP
      0 LOCALS|  X.TEMP |
    OBJECT.FORM.RENDER PLUCK
    -1 FRONT.CAP.BIT XOR AND
    OBJECT.FORM.RENDER PLACE
    0 FRONT.CAP? !
    4 CURRENT.POINT !
    UPSIDE POINT.TO SWAP DROP
    DOWNSIDE POINT.TO SWAP DROP OR
    UPTOP POINT.TO SWAP  DROP OR
    DOWNTOP POINT.TO SWAP DROP OR
    0= IF
      UPSIDE POINT.TO  DROP to X.TEMP
      DOWNSIDE POINT.TO  DROP X.TEMP =
      UPTOP POINT.TO   DROP X.TEMP = and
      DOWNTOP POINT.TO  DROP X.TEMP = and
      IF
        UPSIDE POINT.TO  DROP to X.TEMP
        INC.CURRENT.POINT
        UPSIDE POINT.TO  DROP X.TEMP =
        DOWNSIDE POINT.TO  DROP X.TEMP = and
        UPTOP POINT.TO   DROP X.TEMP = and
        DOWNTOP POINT.TO  DROP X.TEMP = and
        IF
          OBJECT.FORM.RENDER PLUCK
          FRONT.CAP.BIT OR
          OBJECT.FORM.RENDER PLACE
          FRONT.CAP.BIT FRONT.CAP? !
        THEN
      THEN
    THEN   ;


  : CHECK.BACK.CAP
    0 0 LOCALS| the.flag X.TEMP |
    OBJECT.FORM.RENDER PLUCK
    -1 BACK.CAP.BIT XOR AND
    OBJECT.FORM.RENDER PLACE
    0 BACK.CAP? !
    CONTOUR @  CURRENT.POINT !
    UPSIDE POINT.TO SWAP DROP
    DOWNSIDE POINT.TO SWAP DROP OR
    UPTOP POINT.TO SWAP  DROP OR
    DOWNTOP POINT.TO SWAP DROP OR
    0= IF
      UPSIDE POINT.TO  DROP to X.TEMP
      DOWNSIDE POINT.TO  DROP X.TEMP =
      UPTOP POINT.TO   DROP X.TEMP = and
      DOWNTOP POINT.TO  DROP X.TEMP = and
      IF
        UPSIDE POINT.TO  DROP to X.TEMP
        DEC.CURRENT.POINT
        UPSIDE POINT.TO  DROP X.TEMP =
```

-000596

T

```
        DOWNSIDE POINT.TO  DROP X.TEMP = and
        UPTOP POINT.TO   DROP X.TEMP = and
        DOWNTOP POINT.TO  DROP X.TEMP = and
        IF
          OBJECT.FORM.RENDER PLUCK
          BACK.CAP.BIT OR
          OBJECT.FORM.RENDER PLACE
          BACK.CAP.BIT BACK.CAP? !
        THEN
      THEN
    THEN ;

\ routines to check inside out polys

: FLIP.CCONTOUR
  4 CURRENT.CPOINT !          \ set increment to start
  CCONTOUR @ 4/ 0 DO          \ loop for number of points in array
  THIS.CPOINT@              \ fetch the point, leave on stack
  INC.CURRENT.CPOINT          \ increment the offset
  LOOP              \ loop till done
  4 CURRENT.CPOINT !          \ set the increment again
  CCONTOUR @ 4/ 0 DO          \ loop for the number of points in array
  THIS.CPOINT!            \ scoop off the stack
  INC.CURRENT.CPOINT          \ increment the offset
  LOOP                \ loop till done
  ;

: FLIP.CONTOUR              \ flips the contour
  4 CURRENT.POINT !          \ init the increment
  CONTOUR @ 4/ 0 DO           \ first loop
  UPTOP POINT.TO
  DOWNTOP POINT.TO           \ get the points
  UPSIDE POINT.TO
  DOWNSIDE POINT.TO
  INC.CURRENT.POINT            \ increment till done
  LOOP
  4 CURRENT.POINT !          \ init the increment
  CONTOUR @ 4/ 0 DO           \ second loop
  DOWNSIDE POINT.FROM          \ put the points
  UPSIDE POINT.FROM
  DOWNTOP POINT.FROM
  UPTOP POINT.FROM
  INC.CURRENT.POINT            \ increment till done
  LOOP
   ;

 : CCONTOUR>SHADE.POINTS           \ loads ccontour in shade points
   0 LOCALS| SHADE.OFFSET !
   4 CURRENT.CPOINT !
   0 SHADE.OFFSET
   CCONTOUR @ 4/ 0 DO
   THIS.CPOINT@  0
   SHADE.POINTS SHADE.OFFSET - FROM.STACK
   SHADE.OFFSET 12 + TO SHADE.OFFSET
   INC.CURRENT.CPOINT
   LOOP
   CCONTOUR @ 4/ #POLY.POINTS ! ;

 : CONTOUR>SHADE.POINTS           \ loads up top contour in shade points
   0 LOCALS| SHADE.OFFSET |
   4 CURRENT.POINT !
   0 SHADE.OFFSET
   CONTOUR @ 4/ 0 DO
```

-000597

```
 UPTOP POINT.TO   0
 SHADE.POINTS SHADE.OFFSET - FROM.STACK
 SHADE.OFFSET 12 + TO SHADE.OFFSET
 INC.CURRENT.POINT
 LOOP
 CONTOUR @ 4/ #POLY.POINTS ! ;


: CHECK.CONTOUR                \ checks the contour and flips if needed
 #POLY.POINTS @ LOCALS| #POINTS |
 CONTOUR>SHADE.POINTS
 TWO.VECTOR
 ZCROSS.PRODUCT
 >R 2DROP R>
 0 > IF
   FLIP.CONTOUR
 THEN
 #POINTS #POLY.POINTS ! ;

: CHECK.CCONTOUR               \ checks the ccontour and flips if needed
 #POLY.POINTS @ LOCALS| #POINTS |
 CCONTOUR>SHADE.POINTS
 TWO.VECTOR
 ZCROSS.PRODUCT
 >R 2DROP R>
 0 < IF
   FLIP.CCONTOUR
 THEN
 #POINTS #POLY.POINTS ! ;


:   LATHE.CLOSED?               \ -- bool
                      \ check for lathe closure on side and top
 CONTOUR UPSIDE + 6+ W@   0=
 CONTOUR DOWNSIDE + 6+ W@  0= AND    \ if top view is closed at beginning

 CONTOUR UPTOP + 6+ W@ 0=         \ or if side view is closed at beginning
 CONTOUR DOWNTOP + 6+ W@ 0= AND OR

 CONTOUR @                   \ if top view is closed at end
 CONTOUR + DOWNSIDE + 2+ W@ 0=
 CONTOUR @
 CONTOUR + UPSIDE + 2+ W@ 0= AND

 CONTOUR @                   \ or if side view is closed at end
 CONTOUR + UPTOP + 2+ W@ 0=
 CONTOUR @
 CONTOUR + DOWNTOP + 2+ W@ 0= AND OR
 AND                        \ both cases must be true to be valid
 ;

: SIDE.POLY.CLOSED?
 \ check for poly closure on side and top

 CONTOUR UPSIDE + 4+ @
 CONTOUR @
 CONTOUR + UPSIDE + @ =

 CONTOUR DOWNSIDE + 4+ @
 CONTOUR @
 CONTOUR + DOWNSIDE + @ = AND

 CONTOUR UPTOP + 4+ @
 CONTOUR @
```

-000598

```
  CONTOUR + UPTOP + @ = AND

  CONTOUR DOWNTOP + 4+ @
  CONTOUR @
  CONTOUR + DOWNTOP + @ = AND
  ;

 :  CROSS.SECTION.CLOSED?
  CCONTOUR 4+ @
  CCONTOUR @
  CCONTOUR +  @ =  ;

: CHECK.BACK.CULL
  LATHE.CLOSED?
  SIDE.POLY.CLOSED? OR
  CROSS.SECTION.CLOSED? AND IF
    OBJECT.FORM.RENDER PLUCK
    -1 CULL.BACK.BIT XOR AND
    OBJECT.FORM.RENDER PLACE
    0 CULL.BACK? !
  ELSE
    OBJECT.FORM.RENDER PLUCK
    CULL.BACK.BIT OR
    OBJECT.FORM.RENDER PLACE
    CULL.BACK.BIT CULL.BACK? !
  THEN ;
```

-000599

6/1/90 20:03 Pict Constants Page 1

```
\ IDS FOR PICTS USED IN SWIVEL

\    0 THRU   80  SYSTEM USE
\   81 THRU 4080  PICS FILE USE
\ 4081 THRU 6081  SWIVEL PICT.FORM USE
\ 6081 THRU 8000  SWIVEL APPLICATION USE

HEX


6100 CONSTANT V.TOOL.PICT
6101 CONSTANT O.TOOL.PICT
6102 CONSTANT VIEW.PICT
6103 CONSTANT SIDE.PICT
6104 CONSTANT TOP.PICT
6105 CONSTANT FRONT.PICT
6110 CONSTANT PICT.TOOL.PICT

6200 CONSTANT POS.ARROWS
6300 CONSTANT ATT.ARROWS

DECIMAL
```

-000600

```
\ PICT.OBJECT CREATION AND EDITING


GLOBAL CURRENT.OBJECT.PICT
0 TO CURRENT.OBJECT.PICT
GLOBAL EMPTY.OBJECT.PICT
0 TO EMPTY.OBJECT.PICT

CREATE  PICT.UP.TREE      0 ,
CREATE  CURRENT.PICT.OBJECT   0 ,
CREATE PICT.OBJECTX  0 ,
CREATE PICT.OBJECTY  0 ,
CREATE  UP.TREE.RECT  0 , 0 ,


: TRANS.PICT.RECT
  0 0 LOCALS| MIDY MIDX  TX2 TY2 TX1 TY1
    TY2 TY1 + 2/ TO MIDY
    TX2 TX1 + 2/ TO MIDX
    TY1 MIDY -  PICT.OBJECTY @ +
    TX1 MIDX -  PICT.OBJECTX @ +
    TY2 MIDY -  PICT.OBJECTY @ +
    TX2 MIDX -  PICT.OBJECTX @ +  ;


: SCRAP.TO.HANDLE
  0 LOCALS| PICT.HANDLE                 \ define locals
  0 TO ERROR.FLAG
  0 ?HEAP.SIZE
  MINHEAPSIZE
  SCRAP.HANDLE @ HANDLE.SIZE 0 MIN +
  > IF                         \ if there is some room in the heap..
    0 FROM.HEAP TO PICT.HANDLE           \ get a handle
    PICT.HANDLE 0= NOT IF               \ if handle is good...
      PICT.HANDLE "PICT GET.SCRAP         \ fetch the scrap
      TO ERROR.FLAG
      ERROR.FLAG NO.ERROR >
      PICT.HANDLE HANDLE.SIZE 0 > AND NOT IF     \ if  scrap errors
        10 SYSBEEP
        PICT.HANDLE TO.HEAP
        0 TO PICT.HANDLE              \ zero the handle
      ELSE
        0 TO ERROR.FLAG
      THEN
    ELSE
      -108 TO ERROR.FLAG              \ POST ERROR IF HANDLE IS NIL
    THEN
  ELSE
      -108 TO ERROR.FLAG              \ POST ERROR IF HANDLE IS NIL
  THEN
  PICT.HANDLE ;


 : HANDLE.TO.SCRAP                    \ handle --copy function for object.scrap
    0 LOCALS| SCRAP.RESULT C.PICT
    0 TO ERROR.FLAG                   \ set global error to zero
    ZERO.SCRAP DROP                   \ zero the scrap
    SCRAP.FLAG @ 0=                   \ if no scrap error
    C.PICT HANDLE.SIZE 1 > AND            \ and the handle is valid
    ERROR.FLAG -1 >  IF               \ and no error has occured
      C.PICT LOCK.HANDLE              \ lock the handle
        C.PICT @ C.PICT HANDLE.SIZE         \ pointer, size, type
        "PICT PUT.SCRAP TO SCRAP.RESULT       \ put in scrap
      SCRAP.RESULT NO.ERROR < IF          \ note result and post
```

-000601

```
      SCRAP.RESULT TO ERROR.FLAG
      DO.ERROR.ALERT
    THEN
    C.PICT UNLOCK.HANDLE             \ unlock the handle
  ELSE
    SCRAP.FLAG @ IF                 \ if a scrap error
      -108 TO ERROR.FLAG              \ post memory error
    THEN
    DO.ERROR.ALERT                  \ else post the error
    ZERO.SCRAP DROP
  THEN ;


: DELETE.OBJECT.PICT
  CURRENT.OBJECT.PICT 0= NOT IF
  CURRENT.OBJECT.PICT HANDLE.SIZE 0 > IF
    CURRENT.OBJECT.PICT DISPOSE.PICTURE              \ release the memory
  THEN
  0 TO CURRENT.OBJECT.PICT
  THEN ;

: (PASTE.OBJECT.PICT)
  DELETE.OBJECT.PICT
  SCRAP.TO.HANDLE
  TO CURRENT.OBJECT.PICT ;


: (COPY.OBJECT.PICT)
  CURRENT.OBJECT.PICT
  HANDLE.TO.SCRAP ;


: (CUT.OBJECT.PICT)
  (COPY.OBJECT.PICT)
  DELETE.OBJECT.PICT ;


: PUT.PICT.TYPE                          \  -- puts pict in object
  CURRENT.OBJECT.PICT
  0 0 LOCALS|  NEW.SIZE OLD.SIZE PICT.HANDLE |
  OBJECT.FORM PLUCK PICT.FORM = IF              \ if its a picture object
    PICT.HANDLE  IF                       \ and the pict has something in it
      PICT.HANDLE HANDLE.SIZE                 \ calc the size
      ' OBJECT.TYPE @ + TO NEW.SIZE             \ of the new object record
      CURRENT.HANDLE HANDLE.SIZE TO OLD.SIZE          \ get the old size
      OLD.SIZE NEW.SIZE = NOT IF              \ if they are not equal
        NEW.SIZE RESIZE.RES.RECORD IF             \ resize the record
          PICT.HANDLE @ OBJECT.PICT MOVE.RECORD      \ and move the pict in
        ELSE
          DO.ERROR.ALERT                  \ if failed, post error
        THEN
      ELSE                        \ if resizing not needed
        PICT.HANDLE @ OBJECT.PICT MOVE.RECORD        \ just move it in
      THEN
    THEN
  ELSE                            \ if not a picture object
    TRUE
    ABORT" Not a Pict Form Object in Put.Pict.Type "     \ post the error for programmer
  THEN  ;


: GET.PICT.TYPE                          \ -- pict.handle
  CURRENT.OBJECT.PICT
```

```
  0 LOCALS| THE.SIZE PICT.HANDLE
 OBJECT.FORM PLUCK PICT.FORM = IF
   DELETE.OBJECT.PICT
   CURRENT.HANDLE HANDLE.SIZE                \ get the current record size
   ' OBJECT.TYPE @ - TO THE.SIZE              \ calculate the pict object size
   THE.SIZE FROM.MIN.HEAP TO PICT.HANDLE           \ allocate the memory
   PICT.HANDLE HANDLE.SIZE THE.SIZE = IF          \ if its successful
     OBJECT.PICT PICT.HANDLE @ SWAP MOVE.RECORD      \ move out the record
   ELSE                          \ if its not
     -108 TO ERROR.FLAG                  \ post an error
     DO.ERROR.ALERT
   THEN
 ELSE                            \ if not a picture object
   TRUE ABORT" Not a Pict Form Object in Get.Pict.Type " \ post an error for the programmer
 THEN
 PICT.HANDLE TO CURRENT.OBJECT.PICT ;                    \ output a pict handle


: PASTE.TO.WORLD
  WORLD.OBJECT SET.CURRENT.OBJECT
  (PASTE.OBJECT.PICT)
  CURRENT.OBJECT.PICT IF
    PICT.FORM OBJECT.FORM PLACE
    PUT.PICT.TYPE
  THEN ;
```

6/1/90 20:03 PIXEL.TRANSFORM Page 1

```
\ translation for pixels to pict

ANEW --TRANS-PIX3--

CREATE  UP.TREE.PIXEL.SCALE  0 ,
CREATE  UP.TREE.PIXEL.POS    0 , 0 , 0 ,
CREATE  PIXEL.POS       0 , 0 , 0 ,
CREATE  MAP.RECT  0 , 0 ,

GLOBAL MAP.MASK
GLOBAL MAP.INC
1 TO MAP.INC
0 TO MAP.MASK

 : SET.TRANSLATION                 \ -- sets up globals for picture mapping
  CURRENT.OBJECT @
  0 0 0 LOCALS| C.X C.Y C.Z C.OBJECT|       \ save the current object as a local
  OBJECT.FORM PLUCK PICT.FORM = IF      \ if it is a picture object ...
    UP.TREE PLUCK              \ fetch the up-tree object
    SET.CURRENT.OBJECT             \ set as current
    CURRENT.OBJECT @
    WORLD.OBJECT -
    PICT.UP.TREE !                \ set the mapping in global
    OBJECT.R3CENTER
    PLUCK
    TO C.Z TO C.Y TO C.X
    OBJECT.RECT PLUCK
    MAP.RECT !RECT                \ set the mapping rectangle
    SCALE.RANGE DUP
    OBJECT.SCALE PLUCK */ROUND
    UP.TREE.PIXEL.SCALE !          \ set the mapping scale
    OBJECT.A3POS PLUCK
    FIX>INTEGER
    UP.TREE.PIXEL.POS 12 LPLACE        \ set the mapping 3pos
    SET.TEST.VEC
    OBJECT.ACOS COSINES SWAP MOVE.RECORD
    TEST.UN.SWIVEL
    C.OBJECT SET.CURRENT.OBJECT        \ set current object back to pict
    OBJECT.RCOS COSINES SWAP MOVE.RECORD  \ set the mapping attitude
    TEST.UN.SWIVEL
    GET.ATTITUDE
    OBJECT.RCOS COSINES SWAP MOVE.RECORD  \ set the mapping attitude
    C.X C.Y C.Z UN.SWIVEL          \ express up.tree center as pict offset
    T.VARS COSINES COS.LENGTH CMOVE
    OBJECT.R3POS PLUCK             \ set the pict pos global
    SUB.3POS
    FIX>INTEGER
    TO C.Z TO C.Y TO C.X
    XOFFSET @ C.X +               \ set the offset for picture drawing
    YOFFSET @ C.Y +
    C.Z
    PIXEL.POS 12 LPLACE
    0 PICT.OBJECTY !
    0 PICT.OBJECTX !
   THEN  ;


 : z.unscale,   assembler              \  z -- unscales z
    d0 pop,
    D0 LONG EXT,
    ZBUFF.SCALE  A0 )#MOVE,
      A0 () D3 LONG MOVE, PL IF,
```

-000604

```
      D0 D3  LONG ASL,
    ELSE,
      D3 LONG NEG,
      D0 D3 LONG ASR,
    THEN,
    d0 push, ;

 : PIXEL.UNSCALE, ASSEMBLER        \ x y z -- x y z unscales by mapping global
    D0 POP, D1 POP, D2 POP,
    D4 RPUSH,
      UP.TREE.PIXEL.SCALE  A0 ) #MOVE,
      A0 () D4 LONG MOVE,         \ d4 - sc
      D0 D3 LONG MOVE,          \ D3 IS Z
      D4 D3 FIX.SCALE,          \ do the scaling
      D4 D1 FIX.SCALE,
      D4 D2 FIX.SCALE,
      D3 D0 LONG MOVE,
      D4 RPOP,
    D2 PUSH, D1 PUSH, D0 PUSH, ;     \ restore d4

 : PIXEL.UNTRANSLATE, ASSEMBLER      \ x y z -- x y z untranslates by mapping global
    UP.TREE.PIXEL.POS A0 ) #MOVE,
    D0 POP, D1 POP, D2 POP,
      A0 () D0 LONG SUB,
    4 A0 I) D1 LONG SUB,
    8 A0 I) D2 LONG SUB,
    D2 PUSH, D1 PUSH, D0 PUSH, ;

 : PIXEL.TRANSLATE, ASSEMBLER        \ x y z -- x y z untranslates by mapping global
    PIXEL.POS A0 ) #MOVE,
    D0 POP, D1 POP, D2 POP,
      A0 () D0 LONG ADD,
    4 A0 I) D1 LONG ADD,
    8 A0 I) D2 LONG ADD,
    D2 PUSH, D1 PUSH, D0 PUSH, ;

 CODE  TEST/FETCH.BUFFER           \ x y -- x y z flag
    SAVE.REGS
      D5 POP, D6 POP,
    (ZBUFF)                 \ fetch address for zbuffer
      A0 () D0 Z.SIZE, MOVE,        \ fetch the zbuffer value
    D0 Z.EXT,
      D0 PUSH,                  \ push on stack
    Z.RECORD 2/ # A0 LONG ADDA,     \ for object buffer
    A0 () D3 Z.SIZE, MOVE,        \ fetch the obuffer value
    D3 Z.EXT,
    PICT.UP.TREE A0 ) #MOVE,
    A0 () D4 LONG MOVE,
    0 D5 MOVEQ,
    D4 D3 Z.SIZE, CMP,
    EQ IF,
    D0 zerase LONG CMPI, NE IF,
      -1 D5 MOVEQ,
    THEN,
    THEN,
    D5 PUSH,
      RESTORE.REGS              \ restore regs
      NEXT END-CODE             \ end
```

-000605

```
CODE OBJECT.PIXEL>PICT.PIXEL        \ maps from screen space to pict space
        SAVE.REGS               \ save the registers
        >OFFSET,                \ offset for screen coordinates
    z.unscale,
    >UN.PROJECT,            \ correct for perspective projection
    PIXEL.UNTRANSLATE,          \ un.translate from up.tree coordinates
    SCALE.UP,               \ scale up for accuracy
    PIXEL.UNSCALE,            \ un scale from up.tree coordinates
    (SWIVEL),               \ transform attitudinally
    SCALE.DOWN,             \ scale down for accuracy
    PIXEL.TRANSLATE,          \ translate for screen offset
    DO POP,               \ drop z
    RESTORE.REGS            \ restore the regs
        NEXT END-CODE              \ done


: 8.DRAW.PIXEL ( X Y -- OUTPUTS DOT )
 0 LOCALS| ZDOT YDOT XDOT
  XDOT YDOT TEST/FETCH.BUFFER SWAP TO ZDOT IF
     XDOT YDOT ZDOT
         OBJECT.PIXEL>PICT.PIXEL
         GET.8.DOT DUP TO ZDOT IF
       ZDOT XDOT   YDOT  COLOR.8.DOT
     THEN
    THEN  ;



:  DRAW.PICT.8
   SET.WATCH.CURSOR
   MAP.RECT @RECT POLY.CLIP MAP.RECT !RECT
   ZBUFFER @ THE.BUFFER !
     8 PENMODE
     BLACK PENPAT
       MAP.RECT 6 + W@  MAP.RECT 2 + W@  DO
     EXIT.FLAG NOT IF
         MAP.RECT 4 + W@  MAP.RECT W@ 1 MAP.MASK and +   DO
          I J  8.DRAW.PIXEL
         MAP.INC  +LOOP
     I 31 AND 0=  IF
      SET.WATCH.CURSOR
      GET.WINDOW
        WORLD.OUTPUT WINDOW
        DISPLAY.WORLD
          WINDOW
   THEN
     ?CMD-PERIOD IF
       10 SYSBEEP
       -1 TO EXIT.FLAG
     THEN
   THEN
     LOOP
   SET.WATCH.CURSOR
   INIT.CURSOR  ;


 : DRAW.BACK.PICT
  ^TEMP.BITS @  0 = NOT IF
    ENTER.CURRENT.BACKPORT
    CURRENT.TEMP.PORT @ (WINDOW)
```

-000806

T

```
      0 0 ZBUFFERX @ ZBUFFERX @
    WHITE PATTERN RECTANGLE
      (DRAW.BACK.PICT)
      EXIT.CURRENT.BACKPORT
    DO.ERROR.ALERT
  THEN ;

: DRAW.PICT.OBJECT
  OBJECT.FORM PLUCK PICT.FORM =
  EXIT.FLAG 0= AND IF
  ^TEMP.BITS @  0 = IF
    -108 TO ERROR.FLAG
    -1 TO EXIT.FLAG
   ELSE
    GET.PICT.TYPE
    ERROR.FLAG 0= IF
      SET.TRANSLATION
      DRAW.BACK.PICT
      DRAW.PICT.8
    ELSE
      -1 TO EXIT.FLAG
    THEN
  THEN
  THEN ;

FIND DRAW.PICT.OBJECT CONSTANT ^DRAW.PICT.OBJECT

: (DRAW.PICT.OBJECTS)
  OPERATION @
  CURRENT.OBJECT @
  LOCALS| C.OBJECT C.OPERATION
  0 TO EXIT.FLAG
  OPEN.TEMP.BITS
  SET.PROJECT.INCREMENT.MASK
  WORLD.OBJECT SET.CURRENT.OBJECT
  ^DRAW.PICT.OBJECT OPERATION !
  TRAVERSE.DOWN.TREE
    GET.WINDOW
      WORLD.OUTPUT WINDOW
      DISPLAY.WORLD
        WINDOW
  C.OBJECT SET.CURRENT.OBJECT
  C.OPERATION OPERATION !
  CLOSE.TEMP.BITS ;

: DRAW.PICT.OBJECTS
  WORLD.OBJECT SET.CURRENT.OBJECT
  REDRAW.OBJECT
  (DRAW.PICT.OBJECTS)   ;
```

6/1/90 20:04 POLY SIDES Page 1

```
cr ." Loading Poly Sidedness..."

  8008 NEW.DIALOG.RECORD

  1 MAKE.ACTIVE.ITEM  POLY.OK
  2 MAKE.ACTIVE.ITEM  POLY.CANCEL
  3 MAKE.RADIO.ITEM   POLY.6
  4 MAKE.RADIO.ITEM   POLY.8
  5 MAKE.RADIO.ITEM   POLY.12
  6 MAKE.RADIO.ITEM   POLY.24
  7 MAKE.RADIO.ITEM   POLY.36
  8 MAKE.RADIO.ITEM   POLY.40
  9 MAKE.RADIO.ITEM   POLY.60
   10 MAKE.RADIO.ITEM   POLY.80

  NAME.DIALOG.RECORD POLY.PANEL

  : SIDED
    360 SWAP / ;

: PUT.POLY.PANEL
  LAST.RADIO.ITEM @  DUP IF          \ if radio item was hit
   CASE
     3 OF   6 SIDED    CIRCLE.RES ! ENDOF
     4 OF   8 SIDED    CIRCLE.RES ! ENDOF
     5 OF  12 SIDED    CIRCLE.RES ! ENDOF
     6 OF  24 SIDED    CIRCLE.RES ! ENDOF
     7 OF  36 SIDED    CIRCLE.RES ! ENDOF
     8 OF  40 SIDED    CIRCLE.RES ! ENDOF
     9 OF  60 SIDED    CIRCLE.RES ! ENDOF
    10 OF  80 SIDED    CIRCLE.RES ! ENDOF
  ENDCASE
  ELSE DROP THEN ;

 24 SIDED CIRCLE.RES !            \ set default

 : GET.POLY.PANEL
  0 LOCALS| POS.ITEM |
  3 TO POS.ITEM
  CIRCLE.RES @
    CASE
     6 SIDED OF 3 TO POS.ITEM ENDOF
     8 SIDED OF 4 TO POS.ITEM ENDOF
     12 SIDED OF 5 TO POS.ITEM ENDOF
     24 SIDED OF 6 TO POS.ITEM ENDOF
     36 SIDED OF 7 TO POS.ITEM ENDOF
     40 SIDED OF 8 TO POS.ITEM ENDOF
     60 SIDED OF 9 TO POS.ITEM ENDOF
     80 SIDED OF 10 TO POS.ITEM ENDOF
  ENDCASE
  POS.ITEM ;


 : DO.POLY.CANCEL
    LOCALS| C.ITEM HIT.ITEM C.RECORD
      DROP 1   ;

      FIND DO.POLY.CANCEL POLY.CANCEL !

 : DO.POLY.OK
    LOCALS| C.ITEM HIT.ITEM C.RECORD
    POLY.PANEL GET.ITEM.DATA
    PUT.POLY.PANEL ;
```

-000608

```
  FIND DO.POLY.OK POLY.OK !

: DO.POLY.PANEL
    POLY.PANEL
    LOCALS| C.DIALOG |
    0 LAST.RADIO.ITEM !          \ init radio global
    GET.POLY.PANEL              \ fetch the things
    C.DIALOG DIALOG.OF INIT.DIALOG     \ open dialog window , push dialog.ptr ond.stack
    C.DIALOG GET.ITEMS            \ Fetch item handles
    C.DIALOG SET.ITEMS            \ set boleans and text
      C.DIALOG HANDLE.ITEMS         \ handle item events
    BEGIN
      DO.MODAL.DIALOG           \ handle modal events
        DUP C.DIALOG HANDLE.ITEMS    \ handle item events
    1 = UNTIL                  \ until ok
    C.DIALOG GET.ITEM.DATA          \ fetch new data to record
      QUIT.DIALOG               \ end of dialog
    discard.activates
     ;

  FIND DO.POLY.PANEL ' POLY.DOUBLE.CLICK !


\ AXE DEM WORDS

AXE POLY.OK
AXE POLY.CANCEL
AXE POLY.6
AXE POLY.8
AXE POLY.12
AXE POLY.24
AXE POLY.36
AXE POLY.40
AXE SIDED
AXE PUT.POLY.PANEL
AXE GET.POLY.PANEL
AXE DO.POLY.CANCEL
AXE DO.POLY.OK
```

6/1/90 20:04 POLY SIDES.SMALL Page 1

```
cr ." Loading Poly Sidedness..."

  8008 NEW.DIALOG.RECORD

  1 MAKE.ACTIVE.ITEM  POLY.OK
  2 MAKE.ACTIVE.ITEM  POLY.CANCEL
  3 MAKE.RADIO.ITEM   POLY.6
  4 MAKE.RADIO.ITEM   POLY.8
  5 MAKE.RADIO.ITEM   POLY.12
  6 MAKE.RADIO.ITEM   POLY.24
  7 MAKE.RADIO.ITEM   POLY.36
  8 MAKE.RADIO.ITEM   POLY.40
  9 MAKE.RADIO.ITEM   POLY.48
   10 MAKE.RADIO.ITEM   POLY.60

  NAME.DIALOG.RECORD POLY.PANEL

  : SIDED
    360 SWAP / ;

: PUT.POLY.PANEL
  LAST.RADIO.ITEM @  DUP IF          \ if radio item was hit
   CASE
     3 OF  6 SIDED    CIRCLE.RES ! ENDOF
     4 OF  8 SIDED    CIRCLE.RES ! ENDOF
     5 OF  12 SIDED   CIRCLE.RES ! ENDOF
     6 OF  20 SIDED   CIRCLE.RES ! ENDOF
     7 OF  24 SIDED   CIRCLE.RES ! ENDOF
     8 OF  36 SIDED   CIRCLE.RES ! ENDOF
     9 OF  40 SIDED   CIRCLE.RES ! ENDOF
    10 OF  60 SIDED   CIRCLE.RES ! ENDOF
  ENDCASE
  ELSE DROP THEN ;

 24 SIDED CIRCLE.RES !              \ set default

 : GET.POLY.PANEL
  0 LOCALS| POS.ITEM |
  3 TO POS.ITEM
  CIRCLE.RES @
    CASE
     6 SIDED OF 3 TO POS.ITEM ENDOF
     8 SIDED OF 4 TO POS.ITEM ENDOF
     12 SIDED OF 5 TO POS.ITEM ENDOF
     20 SIDED OF 6 TO POS.ITEM ENDOF
     24 SIDED OF 7 TO POS.ITEM ENDOF
     36 SIDED OF 8 TO POS.ITEM ENDOF
     40 SIDED OF 9 TO POS.ITEM ENDOF
     60 SIDED OF 10 TO POS.ITEM ENDOF
  ENDCASE
  POS.ITEM ;


: DO.POLY.CANCEL
    LOCALS| C.ITEM HIT.ITEM C.RECORD
      DROP 1   ;

      FIND DO.POLY.CANCEL POLY.CANCEL !

: DO.POLY.OK
    LOCALS| C.ITEM HIT.ITEM C.RECORD |
    POLY.PANEL GET.ITEM.DATA
    PUT.POLY.PANEL ;
```

-000610

```
   FIND DO.POLY.OK POLY.OK !

: DO.POLY.PANEL
    POLY.PANEL
    LOCALS! C.DIALOG |
    0 LAST.RADIO.ITEM !          \ init radio global
    GET.POLY.PANEL             \ fetch the things
    C.DIALOG DIALOG.OF INIT.DIALOG    \ open dialog window , push dialog.ptr onto.stack
    C.DIALOG GET.ITEMS           \ Fetch item handles
    C.DIALOG SET.ITEMS           \ set boleans and text
      C.DIALOG HANDLE.ITEMS        \ handle item events
    BEGIN
      DO.MODAL.DIALOG          \ handle modal events
        DUP C.DIALOG HANDLE.ITEMS   \ handle item events
    1 = UNTIL                  \ until ok
    C.DIALOG GET.ITEM.DATA        \ fetch new data to record
      QUIT.DIALOG              \ end of dialog
    discard.activates ;

  FIND DO.POLY.PANEL ' POLY.DOUBLE.CLICK !
```

-000611

```
\ postscript comments for drawing polys

 ANEW --POST.IMAGE.1--

401 MakeSwapOver Draw.Postscript.Image
StartSwapOver


\ PICCOMMENT DEF

HEX

CODE PIC.COMMENT          \ kind size handle
  D0 POP,
  D1 POP,
  D2 POP,
  D2 WPUSH,
  D1 WPUSH,
  D0 PUSH,
  A8F2  W,
NEXT END-CODE
DECIMAL

\ postscript enhancements for laserwriter


   190 constant PostScriptBegin
   191 constant PostScriptEnd
     192 constant PostScriptHandle
     0 constant ^Hex.Tab
     0 constant ^Image.String


   CREATE "DEF     ," def "
   CREATE "/WIDTH  ," /width "
   CREATE "/HEIGHT ," /height "
   CREATE "PSLine1 ," /fact 1.00000000 def "
   CREATE "PsLine2 ," /picstr width string def "
   CREATE "PsLine3 ," /swivpic "
   CREATE "PsLine4 ," {gsave "
   CREATE "PsLine5 ," width height 8 "
   CREATE "PsLine6 ," [width 0 0 height 0 0] "
   CREATE "PsLine7 ," {currentfile picstr readstring pop} "
   CREATE "PsLine8 ," image "
   CREATE "PsLine9 ," grestore "
   CREATE "PsLine10 ," } def "
   CREATE "PsLine11 ," -12 5 translate "
   CREATE "PsLine12 ," width fact mul height fact mul scale  "
   CREATE "PsLine13 ," swivpic "


 \ color calculation and lookup

   : CALC.HALF.COLOR          \ rgb record -- color value scaled to color.scale
   @RGB
   LOCALS| H.BLUE H.GREEN H.RED
   HALFTONE.COLOR @ CASE
     0 OF H.BLUE H.GREEN H.RED      \ if black average colors
       + +  3 / ENDOF
     1 OF H.RED   ENDOF        \ if cyan, use red luminance
     2 OF H.GREEN ENDOF        \ if magenta, use green luminance
     3 OF H.BLUE  ENDOF        \ if yellow use blue luminance
   ENDCASE ;
```

-000612

```
: CREATE.HEX.TAB            \ creates look-up for ps conversion
256  FROM.MIN.HEAP
' ^Hex.Tab !
^Hex.Tab HANDLE.SIZE 256  = IF
HEX                 \ interpret numbers as hex
256 0 DO              \ loop for number of colors
  I TEMP.RGB BackIndex2Color    \ get rgb for this index
  TEMP.RGB CALC.HALF.COLOR
  255 COLOR.SCALE */        \ scale to 8 bit
  ^Hex.Tab @ I + c!
LOOP                \ loop till done
DECIMAL
ELSE                \ else post error and abort
  -108 to error.flag
THEN  ;


: DISPOSE.HEX.TAB
^HEX.TAB HANDLE.SIZE 256 2* - IF
  ^HEX.TAB TO.HEAP
  0 ' ^HEX.TAB !
THEN ;


: Create.Image.String
ZbufferX @ 4+ 256 max
FROM.MIN.HEAP ' ^Image.String !
^Image.String HANDLE.SIZE
ZbufferX @ 4+ 256 max  = not IF
  -108 to error.flag
THEN  ;

: Dispose.Image.String
^Image.String HANDLE.SIZE
ZbufferX @ 4+ 256 max = IF
  ^Image.String TO.HEAP
  0 ' ^Image.String !
THEN ;


CODE CONVERT.SCAN.LINE          \ ^BITS ^STRING #BYTES --
save.regs
D2 POP,
A0 POP,
A1 POP,
' ^HEX.TAB A2 )#MOVE,
A2 () A2 LONG MOVE,           \ a2 = handle to tab
A2 () A2 LONG MOVE,           \ a2 = pointer to tab
D2 1 LONG SUBQ,
PL IF,
BEGIN,
  0 D0 MOVEQ,             \ do the loop
  A1 )+ D0 BYTE MOVE,
  D0 0 WORD A2 @I) D1 BYTE MOVE,
  D1 A0 )+ BYTE MOVE,
D2 LOOP,
THEN,
RESTORE.REGS
NEXT END-CODE
```

```
code @BackXY
  SAVE.REGS
 D0 GET,                    \ fetch y
   2 SP@, D0 LONG OR,           \ or with x
   D0 -1024 WORD ANDI, EQ IF,       \ if within index
      ^SCAN.ARRAY  A1 )#MOVE,       \ a0 is scan array
  A1 () A0 LONG MOVE,
  SCAN.INDEX  A1 )#MOVE,        \ a1 is scan index
    D0 POP, D1 POP,
  D0 2 # WORD ASL,          \ y * 2
  D0 0 WORD A1 @I) D3 LONG MOVE,    \ fetch index to array
    D3 0 LONG A0 @I) A2 LONG MOVE,    \ a2 = start yscan address
      D1 2 # WORD ASL,          \ x * 2
  D1 0 WORD A1 @I) D3 LONG MOVE,    \ fetch x index to array
    D3 X.BYTE LONG A0 @I) D0 WORD MOVE, \ d0 = xbyte
    D0 0 WORD A2 @I) PEA,
 ELSE,  SP 8 LONG ADDQ,
    0 LIT,
THEN,                     \ else clear stack, leave zero
restore.regs
next end-code



: POST.STRING               \ String -- posts picture comment
LOCALS| THE.STRING |
THE.STRING 1+ ^Image.String @
THE.STRING C@ CMOVE
13 ^Image.String @  THE.STRING C@ - 1- C!
PostScriptHandle
THE.STRING C@
^Image.String
PIC.COMMENT  ;


: Post.Image                \ y -- posts image data
locals| The.Y |
0 The.Y @BackXY
^Image.String @ Zbufferx @
CONVERT.SCAN.LINE
PostScriptHandle
 zbufferx @
^Image.String
PIC.COMMENT ;

CREATE "PsLine4a  ,"  50 0 {dup mul exch dup mul add 1 exch sub} setscreen "
CREATE "PsLine4b  ,"  74 0 {dup mul exch dup mul add 1 exch sub} setscreen "
CREATE "PsLine4c  ," 100 0 {dup mul exch dup mul add 1 exch sub} setscreen "
CREATE "PsLine4d  ," 150 0 {dup mul exch dup mul add 1 exch sub} setscreen "
CREATE "PsLine4e ,"  50 30 {dup mul exch dup mul add 1 exch sub} setscreen "
CREATE "PsLine4f ,"  74 30 {dup mul exch dup mul add 1 exch sub} setscreen "
CREATE "PsLine4g ," 100 30 {dup mul exch dup mul add 1 exch sub} setscreen "
CREATE "PsLine4h ," 150 30 {dup mul exch dup mul add 1 exch sub} setscreen "
CREATE "PsLine4i ,"  50 60 {dup mul exch dup mul add 1 exch sub} setscreen "
CREATE "PsLine4j ,"  74 60 {dup mul exch dup mul add 1 exch sub} setscreen "
CREATE "PsLine4k ," 100 60 {dup mul exch dup mul add 1 exch sub} setscreen "
CREATE "PsLine4l ," 150 60 {dup mul exch dup mul add 1 exch sub} setscreen "


: Post.Screen.Res           \ uses global HALFTONE.SCREEN to chose postscript string
HALFTONE.SCREEN @ case
   0 of "PsLine4a  POST.STRING endof
  1 of "PsLine4b  POST.STRING endof
```

```
  2 of "PsLine4c  POST.STRING endof
  3 of "PsLine4d  POST.STRING endof
  4 of "PsLine4e  POST.STRING endof
  5 of "PsLine4f  POST.STRING endof
  6 of "PsLine4g  POST.STRING endof
  7 of "PsLine4h  POST.STRING endof
  8 of "PsLine4i  POST.STRING endof
  9 of "PsLine4j  POST.STRING endof
   10 of "PsLine4k  POST.STRING endof
   11 of "PsLine4l  POST.STRING endof
   ENDCASE ;


: POST.PS.HEADER
scratch.string 255 erase
"/WIDTH scratch.string +STRING
ZBUFFERX @ NUMBER>S
scratch.string SWAP +PHRASE
"DEF scratch.string +STRING
scratch.string POST.STRING
scratch.string 255 erase
"/HEIGHT scratch.string +STRING
ZBUFFERY @ NUMBER>S
scratch.string SWAP +PHRASE
"DEF scratch.string +STRING
scratch.string POST.STRING
"PSLine1 POST.STRING
"PSLine2 POST.STRING
"PSLine3 POST.STRING
"PSLine4 POST.STRING
Post.Screen.Res
"PSLine5 POST.STRING
"PSLine6 POST.STRING
"PSLine7 POST.STRING
"PSLine8 POST.STRING
"PSLine9 POST.STRING
"PSLine10 POST.STRING
"PSLine11 POST.STRING
"PSLine12 POST.STRING
"PSLine13 POST.STRING
;


: (Draw.Postscript.Image)          \   -- draws embedded postscript picture from backport
  white penpat
  0 0 (move.to)
  10 10 (line.to)
  black penpat
  CREATE.HEX.TAB        \ create look-up for image data
  CREATE.IMAGE.STRING    \ create the handle
  ERROR.FLAG 0= IF
    PostScriptBegin 0 0    \ start post script
    Pic.comment
    DISPLAY.PRINT      \ if not a post-script device, just draw the bitmap
    POST.PS.HEADER       \ download the image program
    ZBUFFERY @ 0 DO
      I POST.IMAGE     \ write image data
    LOOP
    PostScriptEnd 0 0
    Pic.comment
  THEN
```

-000615

```
    DISPOSE.IMAGE.STRING  \ clean up
    DISPOSE.HEX.TAB ;

  SetSwapOverToken
  EndSwapOver
```

```
\ postscript comments for drawing polys

 ANEW --POST.TREE.1--

402 MakeSwapOver DRAW.POSTSCRIPT.TREE
StartSwapOver


\ PICCOMMENT DEF

HEX

CODE PIC.COMMENT           \ kind size handle
  D0 POP,
  D1 POP,
  D2 POP,
  D2 WPUSH,
  D1 WPUSH,
  D0 PUSH,
  A8F2  W,
NEXT END-CODE
DECIMAL

\ postscript enhancements for laserwriter


  190 constant PostScriptBegin
  191 constant PostScriptEnd
    192 constant PostScriptHandle
    0 constant ^Hex.Tab
    0 constant ^Image.String



  : Create.Image.String
  ZbufferX @ 4+ 256 max
  FROM.MIN.HEAP ' ^Image.String !
  ^Image.String HANDLE.SIZE
  ZbufferX @ 4+ 256 max  = not IF
    -108 to error.flag
  THEN  ;

  : Dispose.Image.String
  ^Image.String HANDLE.SIZE
  ZbufferX @ 4+ 256 max = IF
    ^Image.String TO.HEAP
    0 ' ^Image.String !
  THEN ;


  : POST.STRING                  \ String -- posts picture comment
  LOCALS| THE.STRING |
  THE.STRING 1+ ^Image.String @
  THE.STRING C@ CMOVE
  13 ^Image.String @  THE.STRING C@ + 1- C!
  PostScriptHandle
  THE.STRING C@
  ^Image.String
  PIC.COMMENT  ;


  :   PostBegin
    CREATE.IMAGE.STRING
```

-000617

```
 PostScriptBegin 0 0   \ start post script
 Pic.comment ;

: PostEnd
 PostScriptEnd 0 0   \ start post script
 Pic.comment
 DISPOSE.IMAGE.STRING  ;


: CALC.HALF.fill            \ rgb record -- color value scaled to color.scale
@RGB
LOCALS| H.BLUE H.GREEN H.RED |
HALFTONE.COLOR @ CASE
  0 OF H.BLUE H.GREEN H.RED      \ if black average colors
    + +  3 / ENDOF
  1 OF H.RED   ENDOF        \ if cyan, use red luminance
  2 OF H.GREEN ENDOF        \ if magenta, use green luminance
  3 OF H.BLUE  ENDOF        \ if yellow use blue luminance
ENDCASE
255 COLOR.SCALE */  ;


: +PostString
  scratch.string SWAP +PHRASE ;

: newpath
  "  newpath  " POST.STRING ;

: closepath
  "  closepath  " POST.STRING ;

: PostFrame
  " " 0 setgray stroke  " POST.STRING ;

: pen
  "  .25 setlinewidth  " POST.STRING ;

CREATE "PsLine4a  ,"  50 0 {dup mul exch dup mul add 1 exch sub} setscreen "
CREATE "PsLine4b  ,"  74 0 {dup mul exch dup mul add 1 exch sub} setscreen "
CREATE "PsLine4c  ," 100 0 {dup mul exch dup mul add 1 exch sub} setscreen "
CREATE "PsLine4d  ," 150 0 {dup mul exch dup mul add 1 exch sub} setscreen "
CREATE "PsLine4e ,"  50 30 {dup mul exch dup mul add 1 exch sub} setscreen "
CREATE "PsLine4f ,"  74 30 {dup mul exch dup mul add 1 exch sub} setscreen "
CREATE "PsLine4g ," 100 30 {dup mul exch dup mul add 1 exch sub} setscreen "
CREATE "PsLine4h ," 150 30 {dup mul exch dup mul add 1 exch sub} setscreen "
CREATE "PsLine4i ,"  50 60 {dup mul exch dup mul add 1 exch sub} setscreen "
CREATE "PsLine4j ,"  74 60 {dup mul exch dup mul add 1 exch sub} setscreen "
CREATE "PsLine4k ," 100 60 {dup mul exch dup mul add 1 exch sub} setscreen "
CREATE "PsLine4l ," 150 60 {dup mul exch dup mul add 1 exch sub} setscreen "


: Post.Screen.Res          \ uses global HALFTONE.SCREEN to chose postscript string
HALFTONE.SCREEN @ case
   0 of "PsLine4a  POST.STRING endof
  1 of "PsLine4b  POST.STRING endof
  2 of "PsLine4c  POST.STRING endof
  3 of "PsLine4d  POST.STRING endof
  4 of "PsLine4e  POST.STRING endof
  5 of "PsLine4f  POST.STRING endof
  6 of "PsLine4g  POST.STRING endof
  7 of "PsLine4h  POST.STRING endof
```

-000618

```
    8 of "PsLine4i  POST.STRING endof
    9 of "PsLine4j  POST.STRING endof
    10 of "PsLine4k  POST.STRING endof
    11 of "PsLine4l  POST.STRING endof
    ENDCASE ;

: post.move.to
  locals| the.X the.Y |
  scratch.string 255 erase
  the.y NUMBER>$  +PostString
  "   " scratch.string +STRING
  the.X NUMBER>$  +PostString
  "  moveto  " scratch.string +STRING
  scratch.string POST.STRING ;


: post.line.to
  locals| the.X the.Y |
  scratch.string 255 erase
  the.y NUMBER>$  +PostString
  "  "  scratch.string +STRING
  the.X NUMBER>$  +PostString
  "  lineto   " scratch.string +STRING
  scratch.string POST.STRING
  ;

: post.fill/frame
  locals| the.rgb |
  the.rgb CALC.HALF.FILL TO the.rgb
  scratch.string 255 erase
  the.rgb NUMBER>$ +PostString
  "  255 div setgray  " scratch.string +STRING
  " gsave fill grestore  " scratch.string +STRING
  scratch.string POST.STRING
  PostFrame ;

: post.fill
  locals| the.rgb |
  the.rgb CALC.HALF.FILL TO the.rgb
  scratch.string 255 erase
  the.rgb NUMBER>$ +PostString
  "  255 div setgray  " scratch.string +STRING
  "  fill  " scratch.string +STRING
  scratch.string POST.STRING
  PostFrame ;


: Print.RENDER                  \ renders the poly according to swivel rendering codes
  THIS.POLY +R.MODE W@
  CASE
    WIREFRAME   OF
      POSTFRAME ENDOF           \ wireframe is just frame the poly
        HIDDENLINE  OF
      White.Rgb post.fill/frame ENDOF
        SHADEDLINE  OF
      THIS.POLY +RED.RGB          \ make and rgb pattern          \ shadeline is shaded and framed
      post.fill/frame ENDOF
    SHADED OF
        THIS.POLY +RED.RGB          \ make an rgb pattern
      Post.fill ENDOF           \ shade is just shaded poly
        Phong OF
      THIS.POLY +RED.RGB          \ make an rgb pattern
```

-000619

```
      Post.fill ENDOF           \ phong is just shaded poly
   ENDCASE ;


 : WRITE.PRINT.Poly                 \ writes the current poly out as a toolbox poly
   0 LOCALS| C.POLY |
   THIS.POLY THE.POINTS @  0 = NOT IF
   newpath
   THIS.POLY THE.POINTS @
   @ POINT>XY   post.move.to
   THIS.POLY #THE.POINTS @ 1 DO
     THIS.POLY THE.POINTS @
     I 4* + @ POINT>XY  post.line.to
     LOOP
   THIS.POLY THE.POINTS @
   @ POINT>XY  post.line.to
   closepath                     \ close the poly
   Print.RENDER                    \ render using swivel render modes
   THEN ;                      \ dispose of the poly


 : WRITE.Print.POLYS                    writes all the polys in the array [illegible]
   POLY.COUNT  0 DO
     I SET.CURRENT.POLY
     0 ?HEAP.SIZE MINHEAPSIZE > IF        \ check for room in heap
       WRITE.TOOL.POLY
         WRITE.PRINT.POLY
     ELSE -1 SCRAP.FLAG !
     THEN
   LOOP ;


: ((DRAW.POSTSCRIPT.TREE))                 \ draws the tree with the toolbox poly
   WATCH SET.CURSOR
   GLOBAL.RENDER @ TO POLY.GLOBAL.RENDER
     ALT.POLY @
   0 0 0 LOCALS| MEM.RESULT POLY.HANDLE POLY.HUNKS C.ALT
   -1 GLOBAL.RENDER !
   ^WRITE.POLY.RECORD ALT.POLY !
   NUMBER.TREE.POLYS
   POLY.COUNT 2 + POLY.RECORD * 2*
   NEW.CLEAR.HANDLE TO MEM.RESULT
   TO POLY.HANDLE
   MEM.RESULT 0= IF
     POLY.COUNT 2 + 16 *
     NEW.CLEAR.HANDLE  TO MEM.RESULT
     TO POLY.HUNKS
     MEM.RESULT 0= IF
       POLY.HANDLE @ TO POLY.ARRAY
       POLY.ARRAY POLY.COUNT 2 + POLY.RECORD * +
       TO TEMP.POLY.ARRAY
       POLY.HANDLE LOCK.HANDLE
       POLY.HUNKS @ TO POLY.HUNK.LIST
       POLY.HUNKS LOCK.HANDLE
       0 TO HUNK.POINTER
       0 SET.CURRENT.POLY
       0 TO POLY.COUNT
       DRAW.TREE
       WATCH SET.CURSOR
       SORT.POLYS
       WRITE.Print.POLYS
       C.ALT ALT.POLY !
       POLY.HUNKS UNLOCK.HANDLE
```

-000620

```
      POLY.HUNKS TO.HEAP
    ELSE
      10 SYSBEEP
      MEM.RESULT TO ERROR.FLAG
    THEN
    POLY.HANDLE UNLOCK.HANDLE
    POLY.HANDLE TO.HEAP
  ELSE
    10 SYSBEEP
    MEM.RESULT TO ERROR.FLAG
  THEN
  C.ALT ALT.POLY !
  POLY.GLOBAL.RENDER GLOBAL.RENDER !
  INIT.CURSOR ;

4 CONSTANT IVRes
6 CONSTANT IHRes


: SET.TOOLBOX.RESOLUTION
  HPrint @ IVRes + w@ Ext ' TBoxVertRes !
  HPrint @ IHRes + w@ Ext ' TBoxHorizRes !  ;


: RESTORE.TOOLBOX.RESOLUTION
  72 ' TBoxVertRes !
  72 ' TBoxHorizRes !  ;


: (DRAW.POSTSCRIPT.TREE)
    Set.Toolbox.Resolution    \ set the resolution to match printer res
    white penpat         \ print dummy calls to fool driver
    0 0 (move.to)
    10 10 (line.to)
    black penpat
    PostBegin
    error.flag 0= if
      Post.Screen.Res
      pen
      WORLD.OBJECT SET.CURRENT.OBJECT
      ((DRAW.POSTSCRIPT.TREE))
    then
    PostEnd
    Restore.toolbox.resolution  ; \ restore the old resolution


  SetSwapOverToken
  EndSwapOver
```

-000621

6/1/90 20:04 QUAD.CROSS Page 1

```
\  draw and edit cross.section
\ Last Revision: 11/27/87  07:56:52 PM   YH

cr ." Loading cross section drawing"

   \ anew cross.draw


MAX.TYPE.POINTS 2POINT.LENGTH  *  CONSTANT  MAX.CONTOUR.CPOINTS


 : this.cpoint!          \ x y -- stores point in ccontour array
   ccontour            \ indexed starting address
   current.cpoint @ +        \ current.cpoint preset
   dup>R 2+ w!          \ store point
   R> w! ;

 : this.cpoint@            \ -- fetches point from ccontour array
    ccontour           \ indexed start address
    current.cpoint @ +       \ current.cpoint preset
    dup>R w@ ext        \ fetch and extend point
    R> 2+ w@ ext ;

 : LAST.CPOINT             \ -- fetches point from ccontour array
    ccontour           \ indexed start address
    current.cpoint @ + 4-    \ current.cpoint preset
    dup>R w@ ext        \ fetch and extend point
    R> 2+ w@ ext ;

: NEXT.CPOINT             \ -- fetches point from ccontour array
    ccontour           \ indexed start address
    current.cpoint @ + 4+    \ current.cpoint preset
    dup>R w@ ext        \ fetch and extend point
    R> 2+ w@ ext ;

: FIRST.CPOINT             \ -- fetches first point from ccontour array
    ccontour  4+        \ indexed start address
    dup>R w@ ext        \ fetch and extend point
    R> 2+ w@ ext ;

: INC.CURRENT.CPOINT       \ increments current cpoint by 1 set of points
   current.cpoint @ 4-
   current.cpoint ! ;

: DEC.CURRENT.CPOINT       \ decrements current cpoint by 1 set of points
   CURRENT.CPOINT  @ 4 > IF
    current.cpoint @ 4-
    current.cpoint !
  THEN ;

: 2=  rot = >R = R> and ;        \ xy xy -- flag is equal


: DRAW.SECTION             \ DRAW THE CURRENT SECTION
  10 PENMODE
   CCONTOUR @ 0 = NOT IF       \ IF ARRAY HAS ELEMENTS
   4 CURRENT.CPOINT !       \ 4 IS FIRST POINT AFTER INDEX
   THIS.CPOINT@ Q.MOVE.TO  BOX     \ SET-UP FIRST POINT
   CCONTOUR @ 4 DO
   INC.CURRENT.CPOINT          \ DRAW THE REST
   THIS.CPOINT@ Q.LINE.TO  BOX
   4 +LOOP  THEN ;
```

-000622

```
: STRETCH.CLINES          \ stretches line from last point to mouse pos.
  10 PENMODE
  CURRENT.CPOINT @ 7 > IF      \ if not first point
    LAST.CPOINT          \ fetch last point
    @GRIDXY
  2DUP DRAW.RULE.MARKS
  4DUP                 \ fetch mouse position after griding
    Q.MOVE.TO
    Q.LINE.TO            \ draw  line
    MOVE/CLICK           \ wait for move
    Q.MOVE.TO
  Q.LINE.TO            \ undraw line
  THEN  ;


: GOOD.CPOINT              \ saves and displays selected point
  10 PENMODE
   CURRENT.CPOINT @ 4 > IF         \ if not first point
   POLY.DOUBLE? NOT IF
       @GRID.DN this.cpoint!        \ write current position to array
      CURRENT.CPOINT @  CCONTOUR !   \ update index for array
        LAST.CPOINT           \ fetch last point
        this.cpoint@          \ fetch this point
        Q.MOVE.TO
        Q.LINE.TO             \ draw line
      THIS.CPOINT@
        FIRST.CPOINT  2+        \ have we returned to begining
        CURRENT.CPOINT @        \ or reached max number of points
        MAX.CONTOUR.CPOINTS - OR
        IF
      -1 OUT.FLAG !
    THEN               \ set out flag
  ELSE
    -1 OUT.FLAG !
  THEN
  ELSE
  MARK.LATHE.CHANGE
  0 CCONTOUR !             \ set index to zero
  @GRID.DN this.cpoint!         \ write current position to array
    CURRENT.CPOINT @  CCONTOUR !     \ update index for array
  THEN
  INC.CURRENT.CPOINT ;          \ increment for next point


: DO.CPOLY                \ inputs poly to current contour array
 10 PENMODE              \ xor mode for rubber banding
    4 CURRENT.CPOINT !          \ 4 is first point after index
    0 OUT.FLAG !            \ zero loop flag
    0 WHEN.DN !             \ zero double click time
  0 @LAST.DN !
  GOOD.CPOINT
   BEGIN
    STRETCH.CLINES          \ show lines stretch
    DO.EVENTS
  DO.RULE.TRACK
  CASE
  IN.MENUBAR OF
    -1 OUT.FLAG ! ENDOF
  MOUSE.DOWN OF             \ some thing is afoot ?
```

-000623

```
     DRAW.IN.BOUNDS? IF
          GOOD.CPOINT        \ handle the new point
     ELSE
       -1 OUT.FLAG !
       CCONTOUR @ 4 = IF
         LAST.CPOINT
         this.cpoint!    \ write current position to array
           CURRENT.CPOINT @
         CCONTOUR !      \ update index for array
       THEN
     THEN
       ENDOF              \ then of mouse down
   ENDCASE
   OUT.FLAG @ UNTIL ;          \ main loop


 : t.draw
  current.cpoint @ 4 = if
      this.cpoint@  Q.MOVE.TO box
      next.cpoint   Q.LINE.TO
  else
      last.cpoint Q.MOVE.TO
    this.cpoint@ Q.LINE.TC box
      current.cpoint @
        ccontour @ = not if
        next.cpoint Q.LINE.TO
    then
  then  ;


variable cwhich.box?


 : ctune.stretch
    cwhich.box? @ current.cpoint !
        t.draw                 \ un draw current
    begin still.down while
          @gridxy
      2DUP DRAW.RULE.MARKS
      this.cpoint!
          t.draw
          move/unclick               \ wait if no motion
          t.draw repeat            \ draw new contour segment
        t.draw ;


 : ccheck.box                 \ x y -- sets current.point if selected
  -1 cwhich.box? !            \ set to nil
    0 current.cpoint !           \ start of array
    ccontour @ 0 do            \ loop thru array
      inc.current.cpoint          \ inc first , starts at 4
       2dup this.cpoint@          \ dup xy mouse
     CURRENT.QUAD @
     >TRANSLATE
    near if                \ if near then store in current
        current.cpoint @
      cwhich.box? !
    then
  4 +loop 2drop ;              \ loop thru all and drop xy
```

-000624

```
: ctune.poly                \ edits contour poly
  10 PENMODE
    @MOUSE POINT>XY   ccheck.box    \ determine segment to edit
    cwhich.box? @ -1 = not if      \ if something was selected
  MARK.LATHE.CHANGE
    ctune.stretch then           \ do the edit
  ;


 : PLACE.CROSS.OVAL
    0 0 LOCALS| XRAD YRAD THE.Y2 THE.X2 THE.Y1 THE.X1 |
    THE.Y2 THE.Y1 - ABS  2/ TO  YRAD
    THE.X2 THE.X1 - ABS  2/ TO  XRAD
    MARK.LATHE.CHANGE
      0 CURRENT.CPOINT !
       362 ANGLE.SCALE *  0 DO
      INC.CURRENT.CPOINT
      I  sin XRAD *
      DUP 0 > IF
        COS.SCALER 2/ + ELSE
        COS.SCALER 2/ -
      THEN
    COS.SCALER /
    THE.X2 THE.X1 MIN XRAD + +
       I  cos YRAD * DUP 0 > IF
        COS.SCALER 2/ + ELSE
        COS.SCALER 2/ -
      THEN
    COS.SCALER /
    THE.Y2 THE.Y1 MIN YRAD + NEG +
    NEG THIS.CPOINT!
      CIRCLE.RES @ ANGLE.SCALE * +LOOP
      CURRENT.CPOINT @ CCONTOUR !
      GRID
      DRAW.SECTION ;


 : (OVAL.SECTION)
    @GRID.DN
    2DUP LOCALS| THE.Y2 THE.X2 THE.Y1 THE.X1 |
    10 PENMODE
    BLACK PENPAT
      BEGIN STILL.DOWN WHILE
        @GRIDXY
        2DUP DRAW.RULE.MARKS
        to THE.Y2
        to THE.X2
          THE.X1 THE.Y1 THE.X2 THE.Y2
        CURRENT.QUAD @ >TRANSLATE 2SWAP
          CURRENT.QUAD @ >TRANSLATE 2SWAP
        FRAME OVAL
          MOVE/UNCLICK
          THE.X1 THE.Y1 THE.X2 THE.Y2
        CURRENT.QUAD @ >TRANSLATE 2SWAP
          CURRENT.QUAD @ >TRANSLATE 2SWAP
        FRAME OVAL
     REPEAT
       THE.X1 THE.Y1 THE.X2 THE.Y2
     PLACE.CROSS.OVAL
     ;


 : (CIRCLE.SECTION)
   MARK.LATHE.CHANGE
```

-000625

```
0 CURRENT.CPOINT !
362 ANGLE.SCALE * 0 do
INC.CURRENT.CPOINT
 I sin GRAPHIC.SCALE *
   DUP 0 > IF
     COS.SCALER 2/ + ELSE
     COS.SCALER 2/ -
   THEN
   COS.SCALER /
 I cos GRAPHIC.SCALE * DUP 0 > IF
     COS.SCALER 2/ + ELSE
     COS.SCALER 2/ -
   THEN
    COS.SCALER /
NEG THIS.CPOINT!
 CIRCLE.RES @ ANGLE.SCALE * +LOOP
 CURRENT.CPOINT @ CCONTOUR !
 GRID
 DRAW.SECTION ;


: CIRCLE.SECTION
 OBJECT.FORM.EDIT PLUCK
 CASE
   EXTRUSION.FORM.EDIT OF (OVAL.SECTION) ENDOF
   LATHE.FORM.EDIT OF (CIRCLE.SECTION) ENDOF
 ENDCASE ;



 CREATE SQUARE.SECTION 20 ,
       GRAPHIC.SCALE -1 * W, GRAPHIC.SCALE -1 * W,
   GRAPHIC.SCALE W, GRAPHIC.SCALE -1 * W,
     GRAPHIC.SCALE W, GRAPHIC.SCALE W,
   GRAPHIC.SCALE -1 * W, GRAPHIC.SCALE W,
       GRAPHIC.SCALE -1 * W, GRAPHIC.SCALE -1 * W,


 CREATE TRIANGLE.SECTION 16 ,
      0 W, GRAPHIC.SCALE -1 * W,
    GRAPHIC.SCALE W, GRAPHIC.SCALE W,
    GRAPHIC.SCALE -1 * W, GRAPHIC.SCALE W,
      0 W, GRAPHIC.SCALE -1 * W,


 : PUT.SECTION
   MARK.LATHE.CHANGE
   DUP>R
   CCONTOUR R> @ 4+ CMOVE
   GRID
   DRAW.SECTION ;

 : DEFAULT.SQUARE
   SQUARE.SECTION DUP>R
    CCONTOUR R> @ 4+ CMOVE ;

  : DEFAULT.TRIANGLE
   TRIANGLE.SECTION DUP>R
    CCONTOUR R> @ 4+ CMOVE ;


  : PLACE.CROSS.RECT
     LOCALS: THE.Y2 THE.X2 THE.Y1 THE.X1
```

-000626

```
MARK.LATHE.CHANGE
  0 CURRENT.CPOINT !
  INC.CURRENT.CPOINT
THE.X1 THE.Y1
  THIS.CPOINT!
INC.CURRENT.CPOINT
THE.X2 THE.Y1
  THIS.CPOINT!
INC.CURRENT.CPOINT
THE.X2 THE.Y2
  THIS.CPOINT!
INC.CURRENT.CPOINT
THE.X1 THE.Y2
  THIS.CPOINT!
INC.CURRENT.CPOINT
THE.X1 THE.Y1
  THIS.CPOINT!
  CURRENT.CPOINT @ CCONTOUR !
  GRID
  DRAW.SECTION ;


: (RECT.SECTION)
  @GRID.DN
  2DUP LOCALS| THE.Y2 THE.X2 THE.Y1 THE.X1
  10 PENMODE
  BLACK PENPAT
    BEGIN STILL.DOWN WHILE
      @GRIDXY
      2DUP DRAW.RULE.MARKS
      to THE.Y2
      to THE.X2
        THE.X1 THE.Y1 THE.X2 THE.Y2
      CURRENT.QUAD @ >TRANSLATE 2SWAP
        CURRENT.QUAD @ >TRANSLATE 2SWAP
      FRAME RECTANGLE
        MOVE/UNCLICK
        THE.X1 THE.Y1 THE.X2 THE.Y2
      CURRENT.QUAD @ >TRANSLATE 2SWAP
        CURRENT.QUAD @ >TRANSLATE 2SWAP
      FRAME RECTANGLE
  REPEAT
    THE.X1 THE.Y1 THE.X2 THE.Y2
  PLACE.CROSS.RECT
  ;

: DO.CROSS.RECT
  OBJECT.FORM.EDIT PLUCK
CASE
  EXTRUSION.FORM.EDIT OF (RECT.SECTION) ENDOF
  LATHE.FORM.EDIT OF SQUARE.SECTION PUT.SECTION  ENDOF
ENDCASE ;
```

6/1/90 20:04 QUAD.SIDE Page 1

```
\ lathe drawing
\ creates symetrical poly and
\ allows separate side and top editing
\ Last Revision: 11/27/87  04:19:49 PM   YH

 CR ."   Loading side drawing... "

\ ANEW SIDE.DRAW

   0 CONSTANT ^UNDO.LATHE

  :  MARK.LATHE.CHANGE
    OBJECT.STATE PLUCK IF
    PUT.CONTOURS
    MARK.CHANGE
       ^UNDO.LATHE UNDO.TOKEN !
     "UNDO.DRAWING SET.UNDOS
  THEN  ;

\ cursors for poly editing

: tune.cursor init.cursor ;
: poly.cursor init.cursor ;

\  side drawing utils

  : DRAW.IN.BOUNDS?          \ Are we in bounds of drawing rect ?
     @MOUSE CURRENT.QUAD @      \ point, rect
     PTINRECT ;           \ returns a word boolean

 : point.from         \  x , y , side -- stores points
   contour +
   current.point @ +    \ current.point is preset
   dup>R 2+ w!
   R> w!  ;

: LAST.POINT          \  x , y , side -- stores points
   contour +
   current.point @ +    \ current.point is preset
   4 -
   dup>R w@ EXT
   R> 2+ w@ EXT ;

 : point.to             \ side -- fetches point  x , y
   contour +
   current.point @ +    \ current.point is preset
   dup>R w@ EXT
   R> 2+ w@ EXT ;

 : write.contour      \ writes symetrical lathe contour
   ABS
   2dup      upside   point.from
   2dup neg  downside point.from
   2dup      uptop    point.from
        neg  downtop  point.from  ;
```

-000628

```
:  BOX              \ X Y -- DRAWS 4 X 4 BOX AROUND POINT
   -2 -2 QR.MOVE.TO
     0 4 QR.LINE.TO
     4 0 QR.LINE.TO
    0 -4 QR.LINE.TO
    -4 0 QR.LINE.TO
     2 2 QR.MOVE.TO  ;

\  contour drawing

: inc.current.point     \ increments current point
  current.point @
  4+ current.point ! ;


PAGE

: draw.contour            \ side  -- draws contour
  10 PENMODE
   4 current.point !    \ set to first point
   dup point.to       \ move to first point
   Q.MOVE.TO  box     \ and draw box
   contour @ 4 do       \ enter loop , contour # is number of points
      inc.current.point   \ increment current.point
      dup point.to      \ fetch point for this side
      Q.LINE.TO  box      \ draw line and box
   4 +loop          \ loop til done
   drop ;         \ drop side



:  draw.side            \ draws side view
   contour @ 0 = not if
     upside   draw.contour
     downside draw.contour
   then ;


:  draw.top             \ draws top view
   contour @ 0 = not if
     uptop   draw.contour
     downtop draw.contour
   then ;


 ( L.DRAW UN.DRAW )                            ( 101985 YH )

     : SYM.DRAW           \ x y 'x 'y -- draws symetrical line pairs
       4DUP
         NEG Q.MOVE.TO
         NEG Q.LINE.TO
             Q.MOVE.TO
             Q.LINE.TO  ;
```

-000629

```
MAX.TYPE.POINTS 2POINT.LENGTH  *  CONSTANT  MAX.CONTOUR.POINTS
```

```
: STRETCH.LINES          \ stretches line from last point to mouse pos.
  10 PENMODE
  CURRENT.POINT @ 7 > IF       \ if not first point
    UPSIDE LAST.POINT        \ fetch last point
    @gridxy
  2DUP DRAW.RULE.MARKS
  ABS 4DUP
    SYM.DRAW             \ draw  line
    MOVE/CLICK           \ wait for move
  SYM.DRAW             \ undraw line
   THEN  ;


 VARIABLE OUT.FLAG         \ flag for ending poly loop

 : POLY.DOUBLE?
   @MOUSE.DN POINT>XY
   @LAST.DN @ POINT>XY
   ROT - ABS >R
   - ABS R> + 2 <
   TICKCOUNT
   WHEN.DN @  -
   DOUBLE.TIME @ < AND IF
   -1 ELSE 0 THEN
   @MOUSE.DN @LAST.DN !
   TICKCOUNT WHEN.DN !  ;


  : GOOD.POINT                  \ saves and displays selected point
  10 PENMODE
    CURRENT.POINT @ 4 > IF           \ if not first point
   POLY.DOUBLE? NOT IF
     @GRID.DN WRITE.CONTOUR         \ write current position to array
         CURRENT.POINT @  CONTOUR !       \ update index for array
       UPSIDE LAST.POINT           \ fetch last point
       UPSIDE POINT.TO            \ fetch this point
       SYM.DRAW              \ draw line
       UPSIDE POINT.TO
     SWAP DROP 0=             \ if 0 on y axis
         CURRENT.POINT @           \ or reached max number of points
         MAX.CONTOUR.POINTS = OR
     IF
             -1 OUT.FLAG !
     THEN                 \ set out flag
     ELSE
     -1 OUT.FLAG !
   THEN
 ELSE
    MARK.LATHE.CHANGE
        0 CONTOUR !                 \ set index to zero
        @GRID.DN WRITE.CONTOUR         \ write current position to array
        CURRENT.POINT @  CONTOUR !       \ update index for array
   THEN
   INC.CURRENT.POINT ;             \ increment for next point


  : DO.POLY                  \ inputs poly to current contour array
     10 PENMODE
     4 CURRENT.POINT !              \ 4 is first point after index
     0 OUT.FLAG !                \ zero loop flag
```

-000630

```
    0 WHEN.DN !                  \ zero double click time
  0 @LAST.DN !
  GOOD.POINT                 \ handle the new point
    BEGIN
    STRETCH.LINES                \ show lines stretch
    DO.EVENTS
  DO.RULE.TRACK
  CASE
  IN.MENUBAR OF
    -1 OUT.FLAG ! ENDOF
  MOUSE.DOWN OF                \ some thing is afoot ?
    DRAW.IN.BOUNDS? IF
          GOOD.POINT             \ handle the new point
    ELSE
      -1 OUT.FLAG !
      CONTOUR @ 4 = IF
         UPSIDE LAST.POINT      \ fetch last point
         WRITE.CONTOUR         \ write current position to array
            CURRENT.POINT @  CONTOUR !  \ update index for array
      THEN
    THEN
      ENDOF                    \ then of mouse down
 ENDCASE
  OUT.FLAG @ UNTIL ;              \ main loop


( S.MID, S.BEGIN, S.END )                        ( 101985 YH )

: dec.current.point
  current.point @
  4- current.point !  ;


: s.mid                 \ draws lines for middle point
    >R  dec.current.point
    R@  point.to  Q.MOVE.TO      \ Q.MOVE.TO last point
        inc.current.point
  R@  point.to  Q.LINE.TO box    \ Q.LINE.TO this point and box
        inc.current.point
  R>  point.to  Q.LINE.TO        \ Q.LINE.TO next point
        dec.current.point ;


: s.begin               \ draws lines for beginning points
   >R
  R@ point.to  Q.MOVE.TO       \ Q.MOVE.TO this point
    box              \ draw box
    inc.current.point
    R> point.to  Q.LINE.TO        \ Q.LINE.TO next point
    dec.current.point  ;

: s.end                 \ draws lines for ending points
  >R dec.current.point
  R@ point.to  Q.MOVE.TO       \ Q.MOVE.TO last point
      inc.current.point
  R> point.to  Q.LINE.TO box ;       \ Q.LINE.TO this point and box


\  NEAR, S.DRAW,

 variable which.box?

  CODE NEAR             \ X Y X Y  -- BOOLEAN  TRUE IF WITHIN 4 PIX
```

-000631

```
  D0 POP, D2 POP,
  D1 POP, D3 POP,
  0 # SP -) LONG MOVE,
  D0 D1 LONG SUB,
D1 ABS,
  D2 D3 LONG SUB,
D3 ABS,
  04 #  D1 LONG CMP,
LT IF,
     04 # D3 LONG CMP,
   LT IF,
        D0 POP,
  -1 # SP -) LONG MOVE,
     THEN,
THEN,
NEXT END-CODE
```

```
: write.conditional               \ x y --  writes to appropriate array
 symetry @ if                  \ symetrical write ?
   abs                       \ use absolute value
   side @ if                   \ if editing side
     2dup upside point.from          \ write to both up and down
       2dup neg downside point.from
   then
   top @ if                    \ if editing top
     2dup       uptop  point.from       \ write to both up and down
   2dup neg downtop  point.from
   then
 else                          \ if unsymetrical
   SIDER @ DUP DOWNSIDE =
   SWAP DOWNTOP = OR if             \ if sider is down
   -1 MIN                      \ limit to -1
       side @  if                  \ down and side ...
       2dup downside               \ writes to downside
     point.from then
     top @  if                 \ down and top..
       2dup downtop                \ writes to downtop
     point.from then
      else 1 MAX                   \ if sider is up
    side @  if                 \ limit to 1
     2dup upside                 \ up and side ...
     point.from   then          \ writes to upside
    top @   if
     2dup uptop                  \ up and top ...
     point.from   then           \ writes to topside
      then
  then 2drop ;                 \ drop x y
```

```
: MID.LINE                     \ draws midline
 SYMETRY @ if                    \ check for symetry
         sider @
           uptop / uptop *           \ round to side or top
           dup         s.mid          \ draw up
           downside + s.mid          \ draw down
   ELSE                        \ unsymetrical...
       sider @    s.mid              \ just draw one side

 THEN ;
```

```
: BEGIN.LINE                \ draw beginning line
   SYMETRY @ if                \ check for symetry
        sider @
          uptop / uptop *          \ round to side or top
          dup        s.begin         \ draw up
          downside + s.begin         \ draw down
   ELSE                     \ unsymetrical...
       sider @    s.begin          \ just draw one side
   THEN ;


 : END.LINE                  \ draws endline
   SYMETRY @ if              \ check for symetry
        sider @
          uptop / uptop *          \ round to side or top
          dup        s.end         \ draw up
          downside + s.end         \ draw down
   ELSE                     \ unsymetrical...
       sider @    s.end            \ just draw one side
   THEN ;


   : s.draw                  \ draw lines for edit
     current.point @  contour @ -          \ flag for end
     current.point @  4 -             \ flag for beginning
     2dup                     \ end, begin, end, begin,
     or not if               \ if not beginning or end
          MID.LINE
     then
      if  BEGIN.LINE then           \ check begin flag
      if  END.LINE   then           \ check end flag
    ;


 : tune.stretch
    which.box? @ current.point !
        s.draw                \ un draw current
    begin still.down while
        @gridxy
    2DUP
    DRAW.RULE.MARKS
    write.conditional           \ write.changes to all
    s.draw
        move/unclick                  \ wait if no motion
    s.draw repeat                  draw new contour segment
        s.draw ;


 : CHECK.BOX -1 WHICH.BOX? !               \ SET TO DEFAULT
    0 CURRENT.POINT !                        \ SET COUNTER TO ZERO
    CONTOUR @ 0 DO                         \ FOR NUMBER OF SECTIONS
      INC.CURRENT.POINT             INCREMENT COUNTER
      2DUP SIDER @ POINT.TO
      CURRENT.QUAD @
    >TRANSLATE NEAR IF           \ GET SECTION POINT, COMPARE
        CURRENT.POINT @
    WHICH.BOX? ! THEN           \ SELECTED SEGMENT > WHICHBOX
    4 +LOOP 2DROP ;


 : (TUNE.POLY)               \ edits contour poly
    Current.quad @
```

-000633

```
  side.quad =    IF                     \ if side
      Q.@MOUSEXY SWAP DROP 0< IF       \ check ymouse pos
          DOWNSIDE SIDER !             \ set side based on y
    ELSE  UPSIDE SIDER ! THEN
  ELSE                   \ must be top
      Q.@MOUSEXY SWAP DROP 0< IF       \ check y pos
      DOWNTOP SIDER !           \ set top based on y
      ELSE   UPTOP   SIDER !  THEN
     THEN
     @MOUSE POINT>XY  check.box       \ determine segment to edit
   WHICH.BOX? @ -1 = NOT IF          \ if something was selected
    MARK.LATHE.CHANGE
      TUNE.STRETCH
   THEN ;                  \ do the edit


: tune.poly                    \ edits side,top poly
   10 PENMODE
   (tune.poly) ;


VARIABLE F.STRETCH

 : SYM.RECT
   F.STRETCH @                 \  X Y X
   SWAP  ABS DUP NEG  SWAP     \  X X -Y +Y
   2SWAP 2DUP MAX >R MIN R>    \  +Y -Y -X -X
   2SWAP                 \  -X +X -Y +Y
   ROT SWAP             \  -X -Y -X +Y
   CURRENT.QUAD @ >TRANSLATE 2SWAP
   CURRENT.QUAD @ >TRANSLATE 2SWAP
   FRAME RECTANGLE ;


 : PLACE.RECTANGLE
   4 CURRENT.POINT !
   F.STRETCH @                 \  X Y X
   SWAP  ABS DUP NEG  SWAP     \  X X -Y -Y
   2SWAP 2DUP MAX >R MIN R>    \  +Y -Y +X -X
   2SWAP                 \  -X +X -Y -Y
   ROT SWAP             \  -X -Y +X -Y
   2SWAP              \  +X +Y -X -Y
   2 PICK 0  write.contour
   INC.CURRENT.POINT
   write.contour
   INC.CURRENT.POINT
   2DUP write.contour
   INC.CURRENT.POINT
   DROP 0   write.contour
   CURRENT.POINT @ CONTOUR ! ;



 : STRETCH.POLY.RECT
   10 PENMODE
  MARK.LATHE.CHANGE
    @GRID.DN DROP F.STRETCH !        \ else we are in bounds ..
      BEGIN STILL.DOWN WHILE
        @GRIDXY
      OBJECT.FORM.EDIT PLUCK
```

-000634

I

```
   EXTRUSION.FORM.EDIT = IF
     DROP GRAPHIC.SCALE
   THEN
   2DUP DRAW.RULE.MARKS
         2DUP
         SYM.RECT
   MOVE/UNCLICK
   SYM.RECT
 REPEAT
   @GRIDXY
 OBJECT.FORM.EDIT PLUCK
 EXTRUSION.FORM.EDIT = IF
     DROP GRAPHIC.SCALE
 THEN PLACE.RECTANGLE
;


: DEFAULT.RECT
 GRAPHIC.SCALE 2 * 3 /
  Xmeasure.grid
  NEG  F.STRETCH !              \ else we are in bounds ..
   GRAPHIC.SCALE 2 * 3 /
  Xmeasure.grid
 GRAPHIC.SCALE 2 * 3 /
  Ymeasure.grid
 PLACE.RECTANGLE ;


: DEFAULT.EXT.RECT
 GRAPHIC.SCALE
  Xmeasure.grid 8/
 NEG  F.STRETCH !               \ else we are in bounds ..
   GRAPHIC.SCALE
  Xmeasure.grid 8/
 GRAPHIC.SCALE
 PLACE.RECTANGLE ;


: SYM.OVAL
  F.STRETCH @           \  X Y X
  SWAP  ABS DUP NEG  SWAP    \  X X -Y -Y
  2SWAP 2DUP MAX >R MIN R>    \  -Y -Y -X -X
  2SWAP                 \  -X -X -Y -Y
  ROT SWAP            \  -X -Y -X -Y
  CURRENT.QUAD @ >TRANSLATE 2SWAP
  CURRENT.QUAD @ >TRANSLATE 2SWAP
  FRAME OVAL ;

VARIABLE OVAL.YRAD
VARIABLE OVAL.XRAD
VARIABLE OVAL.XOFF
VARIABLE MAXX.OVAL
VARIABLE  MIN.OVAL

 : PLACE.OVAL
   0 CURRENT.POINT !
   ABS OVAL.YRAD !
   F.STRETCH @
   2DUP MAX MAXX.OVAL !
        MIN  MIN.OVAL !
   MAXX.OVAL @  MIN.OVAL @ -
   2/ OVAL.XRAD  !
   MIN.OVAL @ OVAL.XRAD @ - OVAL.XOFF !
```

-000635

```
184 ANGLE.SCALE * 0 DO
 INC.CURRENT.POINT
 I COS OVAL.XRAD @ *
DUP 0 > IF
    COS.SCALER 2/ + ELSE
    COS.SCALER 2/ -
THEN
 COS.SCALER / NEG OVAL.XOFF @ -
 I SIN OVAL.YRAD @ *
DUP 0 > IF
    COS.SCALER 2/ + ELSE
    COS.SCALER 2/ -
THEN
 COS.SCALER / write.contour
CIRCLE.RES @  ANGLE.SCALE *  +LOOP
CURRENT.POINT @ CONTOUR ! ;


: STRETCH.POLY.OVAL
  10 PENMODE
    MARK.LATHE.CHANGE
  @GRID.DN DROP F.STRETCH !        \ else we are in bounds ..
    BEGIN STILL.DOWN WHILE
            @GRIDXY
      OBJECT.FORM.EDIT PLUCK
      EXTRUSION.FORM.EDIT = IF
      DROP GRAPHIC.SCALE
       THEN
       2DUP DRAW.RULE.MARKS
             2DUP
             SYM.OVAL
       MOVE/UNCLICK
       SYM.OVAL
  REPEAT
    @GRIDXY
  OBJECT.FORM.EDIT PLUCK
  EXTRUSION.FORM.EDIT = IF
    DROP GRAPHIC.SCALE
  THEN PLACE.OVAL  ;
```

```
\ OBJECT DRAWING INTERFACE

 ANEW -THE.QUADS-

cr ." Loading Quad Utilities ..."

GLOBAL TRACE.PICT
0 TO TRACE.PICT

GLOBAL TRACE.OFFSET
0 TO TRACE.OFFSET

CREATE TRACE.RECT 0 , 0 ,

CREATE PICT.TRACE.Y   0 ,
CREATE PICT.TRACE.X   0 ,

CREATE END.FLAG 0 ,
CREATE INIT.FLAG 0 ,

CREATE LAST.UPDATE NULL.TOKEN ,
CREATE TEMP.STRIP 0 , 0 ,
CREATE FULL.QUAD   0 ,
CREATE FULL.STRIP  0 ,

NULL.TOKEN CONSTANT ^(DO.RULE.TRACK)
NULL.TOKEN CONSTANT  ^DRAW.TRACE.PICT
TOKEN.FOR 2DROP CONSTANT ^(DRAW.RULE.MARKS)

GLOBAL  LAST.RULE.POINT
CREATE  LAST.RULE.RECT 0 , 0 ,
GLOBAL  LAST.QUAD  0 TO LAST.QUAD

35 CONSTANT  MIN.LETTER.SPACE
 4 CONSTANT  MIN.PIX.SPACE


 0 CONSTANT LATHE.FORM.EDIT
 1 CONSTANT EXTRUSION.FORM.EDIT


GLOBAL RULERS?
0 TO RULERS?
16 CONSTANT rule.WIDTH


\ object.drawing
\ 2d translations structures, operators
\ SIDE COSINES DEFINITION

VARIABLE VTOP.COS     COS.LENGTH ALLOT
0    YAW  90 ANGLE.SCALE *  PITCH  0 ROL
COSINES VTOP.COS COS.LENGTH CMOVE

VARIABLE VBOTTOM.COS  COS.LENGTH ALLOT
0   YAW   -90  ANGLE.SCALE * PITCH  0  ROL
COSINES VBOTTOM.COS COS.LENGTH CMOVE

VARIABLE TOP.COS     COS.LENGTH ALLOT
90   ANGLE.SCALE *  YAW  0  PITCH  -90 ANGLE.SCALE *  ROL
COSINES TOP.COS COS.LENGTH CMOVE

VARIABLE BOTTOM.COS    COS.LENGTH ALLOT
90   ANGLE.SCALE *  YAW  0  PITCH  90 ANGLE.SCALE *   ROL
```

-000637

```
COSINES BOTTOM.COS COS.LENGTH CMOVE

VARIABLE FRONT.COS    COS.LENGTH ALLOT
0   YAW  0  PITCH  0  ROL
COSINES FRONT.COS COS.LENGTH CMOVE

VARIABLE BACK.COS     COS.LENGTH ALLOT
180  ANGLE.SCALE *  YAW  0  PITCH  0  ROL
COSINES BACK.COS COS.LENGTH CMOVE

VARIABLE LEFT.COS     COS.LENGTH ALLOT
90   ANGLE.SCALE *  YAW  0  PITCH  0  ROL
COSINES LEFT.COS COS.LENGTH CMOVE

VARIABLE RIGHT.COS    COS.LENGTH ALLOT
-90   ANGLE.SCALE *  YAW  0  PITCH  0   ROL
COSINES RIGHT.COS COS.LENGTH CMOVE


 : SCREEN.OBJECT                    \ creates object if current is world
   CURRENT.OBJECT @
  WORLD.OBJECT = IF                   \ if object is the world
    CLEAR.MOVING                    clear moving objects
    RESET.UNDO
    NEW.OBJECT
    CURRENT.OBJECT @  WORLD.OBJECT >  IF
      ^DELETE.OBJECT UNDO.TOKEN !
      "UNDO.NEW SET.UNDOS
      CURRENT.OBJECT @ DUP UN.OBJECT !
      MOST.CURRENT !
      FRONT.CAP.BIT
      BACK.CAP.BIT OR
      OBJECT.FORM.RENDER PLACE
      LATHE.FORM.EDIT OBJECT.FORM.EDIT PLACE
      90 ANGLE.SCALE *  YAW 0 PITCH 0 ROL
      COSINES OBJECT.ACOS MOVE.RECORD
        0 0 0 OBJECT.A3POS PLACE
      SET.RELATIVE
      DRAW.OBJECT
        DISPLAY.WORLD.OUTPUT
    ELSE
      -108 to error.flag
      do.error.alert abort
    THEN
  THEN  ;


15 CONSTANT STRIP.WIDTH


 STRUCTURE TRANS.RECORD
  SHORT: +A.TOP
  SHORT: +A.LEFT
  SHORT: +A.BOTTOM
  SHORT: +A.RIGHT
  SHORT: +X.OFFSET
  SHORT: +Y.OFFSET
  SHORT: +X.CENTER
  SHORT: +Y.CENTER
  SHORT: +SCALE
  SHORT: +SCALE.RANGE
 STRUCTURE.END

: >NORMAL.SCALE, ASSEMBLER
```

```
  GRAPHIC.SHIFT NORMAL.SHIFT - = LONG ASL, ;

CODE >NORMAL.SCALE
  DO POP,
    DO >NORMAL.SCALE,
  DO PUSH,
  NEXT END-CODE

 CODE >TRANSLATE  \ xy trans.record -- 'X 'Y
  a0 pop,
  d0 pop,
  d1 pop,
  0 +X.CENTER A0 I)  D1 WORD ADD,
  0 +Y.CENTER A0 I)  D0 WORD ADD,
  0 +SCALE A0 I) D1 MULS,
  0 +SCALE A0 I) D0 MULS,
  0 +SCALE.RANGE  A0 I)  D1  TDIVS,
  0 +SCALE.RANGE  A0 I)  D0  TDIVS,
  0 +X.OFFSET A0 I)  D1 WORD ADD,
  0 +Y.OFFSET A0 I)  D0 WORD ADD,
  D1 LONG EXT,
  D0 LONG EXT,
  D1 PUSH,
  D0 PUSH, NEXT END-CODE

 CODE TRANSLATE>  \  'X 'Y trans.record -- xy
  a0 pop,
  d0 pop,
  d1 pop,
  0 +X.OFFSET A0 I)  D1 WORD SUB,
  0 +Y.OFFSET A0 I)  D0 WORD SUB,
  0 +SCALE.RANGE A0 I) D1 MULS,
  0 +SCALE.RANGE A0 I) D0 MULS,
  0 +SCALE. A0 I)  D1  TDIVS,
  0 +SCALE  A0 I)  D0  TDIVS,
  0 +X.CENTER A0 I)  D1 WORD SUB,
  0 +Y.CENTER A0 I)  D0 WORD SUB,
  D1 LONG EXT,
  D0 LONG EXT,
  D1 PUSH,
  D0 PUSH, NEXT END-CODE


  CREATE Q.POS  0 , 0 ,

  CREATE SIDE.QUAD
  0 W, 0 W, 200 W, 200 W,   \ A.RECT
  0 W, 0 W,          \ X, Y OFFSETS
  0 W, 0 W,          \ X, Y OFFSETS
  NORMAL.SCALE W,  GRAPHIC.SCALE W,     \ SCALE FACTORS

  CREATE TOP.QUAD
  0 W, 0 W, 200 W, 200 W,   \ A.RECT
  0 W, 0 W,          \ X, Y OFFSETS
  0 W, 0 W,          \ X, Y OFFSETS
  NORMAL.SCALE W,  GRAPHIC.SCALE W,     \ SCALE FACTORS

  CREATE CROSS.QUAD
  0 W, 0 W, 200 W, 200 W,   \ A.REC.
  0 W, 0 W,          \ X, Y OFFSETS
  0 W, 0 W,          \ X, Y OFFSETS
  NORMAL.SCALE W,  GRAPHIC.SCALE W,     \ SCALE FACTORS

  CREATE WIRE.QUAD
```

-000639

```
  0 W, 0 W, 200 W, 200 W,    \ A.RECT
  0 W, 0 W,            \ X, Y OFFSETS
  0 W, 0 W,            \ X, Y OFFSETS
  NORMAL.SCALE W,  GRAPHIC.SCALE W,     \ SCALE FACTORS

CREATE CURRENT.QUAD  0 ,

\ CREATE RECTANGLES FOR DRAWING INTERFACE QUADRANTS

CREATE WIRE.STRIP     0 , 0 ,
CREATE CROSS.STRIP    0 , 0 ,
CREATE SIDE.STRIP     0 , 0 ,
CREATE TOP.STRIP      0 , 0 ,

: Q.POINT.CLIP
  LOCALS| C.QUAD C.Y C.X
  C.X
  C.QUAD +A.LEFT W@ EXT MAX
  C.QUAD +A.RIGHT W@ EXT MIN
  C.Y
  C.QUAD +A.TOP W@ EXT MAX
  C.QUAD +A.BOTTOM W@ EXT MIN  ;

: Q.DOT
  CURRENT.QUAD @ >TRANSLATE
  2DUP  (MOVE.TO) (LINE.TO) ;


: Q.MOVE.TO
  CURRENT.QUAD @ >TRANSLATE
  2DUP Q.POS 2! (MOVE.TO) ;

: Q.LINE.TO
  CURRENT.QUAD @ >TRANSLATE
  2DUP Q.POS 2! (LINE.TO) ;

: QR.MOVE.TO
  Q.POS 2@ ROT + >R + R> 2DUP Q.POS 2! (MOVE.TO) ;

: QR.LINE.TO
  Q.POS 2@ ROT + >R + R> 2DUP Q.POS 2! (LINE.TO) ;

: Q.@MOUSEXY
  @MOUSE POINT>XY
  CURRENT.QUAD @  Q.POINT.CLIP
  CURRENT.QUAD @  TRANSLATE> ;

: Q.@MOUSE.DN
  @MOUSE.DN POINT>XY
  CURRENT.QUAD @  Q.POINT.CLIP
  CURRENT.QUAD @  TRANSLATE> ;

: TEST.QUAD
  LOCALS| C.QUAD C.POINT |
  C.POINT C.QUAD PTINRECT IF
    C.QUAD CURRENT.QUAD !
    THEN  ;

: SET.CURRENT.QUAD
  @MOUSE.DN
  DUP WIRE.QUAD TEST.QUAD
  DUP SIDE.QUAD TEST.QUAD
  DUP TOP.QUAD  TEST.QUAD
```

-000640

```
    CROSS.QUAD TEST.QUAD ;


: SET.TRANSLATION.CENTER
    DUP @RECT  LOCALS| GX GY LX LY C.QUAD  |
  GX LX -  2/ LX +  C.QUAD +X.OFFSET W!
  GY LY -  2/ LY +  C.QUAD +Y.OFFSET W! ;


: SET.QUAD.STRIP
  LOCALS| C.QUAD C.STRIP |
  C.QUAD @RECT 3 PICK  STRIP.WIDTH - MIN
  O.TOOL.WIDTH MAX
  C.STRIP !RECT
  C.QUAD +A.LEFT W@ STRIP.WIDTH + 1 -
  C.QUAD +A.RIGHT W@ MIN
  O.TOOL.WIDTH MAX
  C.QUAD +A.LEFT W!
  ;


: SET.RULER.STRIP
  LOCALS| C.QUAD |
  rulers? if
    C.QUAD +A.LEFT W@ EXT rule.WIDTH + 1 -
    C.QUAD +A.RIGHT W@ EXT MIN
    O.TOOL.WIDTH MAX
    C.QUAD +A.LEFT W!
    C.QUAD +A.TOP W@ EXT rule.WIDTH + 1 -
    C.QUAD +A.BOTTOM W@ EXT MIN
    C.QUAD +A.TOP W!
  then ;



: SET.QUAD.LIMITS
  GET.WINDOW
  0 0 LOCALS| CENTER.X CENTER.Y C.WINDOW
  C.WINDOW   PRIGHTBOUNDS W@  SCROLL.WIDTH - 1-
  C.WINDOW   PLEFTBOUNDS W@   O.TOOL.WIDTH + -
  2/   O.TOOL.WIDTH + O.TOOL.WIDTH MAX  TO CENTER.X
  C.WINDOW   PDOWNBOUNDS W@ SCROLL.WIDTH - 1-
  C.WINDOW   PUPBOUNDS W@ -
  2/  TO CENTER.Y

  -1 O.TOOL.WIDTH CENTER.Y CENTER.X  WIRE.QUAD !RECT     \ set wire.quadrant
  WIRE.STRIP WIRE.QUAD SET.QUAD.STRIP
  WIRE.quad SET.RULER.STRIP
  WIRE.QUAD SET.TRANSLATION.CENTER             \ set center offset

  -1  CENTER.X 1 -
  CENTER.Y C.WINDOW PRIGHTBOUNDS W@  SCROLL.WIDTH - 1-
    O.TOOL.WIDTH MAX
  TOP.QUAD !RECT                       \ set top.quadrant
  TOP.STRIP TOP.QUAD SET.QUAD.STRIP            \ set id.strip
  TOP.QUAD SET.RULER.STRIP
  TOP.QUAD SET.TRANSLATION.CENTER              \ set center offset

  CENTER.Y  1 - O.TOOL.WIDTH
  C.WINDOW PDOWNBOUNDS W@ SCROLL.WIDTH - 1-
  CENTER.X  CROSS.QUAD !RECT             \ set cross.quadrant
  CROSS.STRIP CROSS.QUAD SET.QUAD.STRIP          \ set id.strip
  CROSS.QUAD SET.RULER.STRIP
  CROSS.QUAD SET.TRANSLATION.CENTER            \ set center offset
```

-000641

```
CENTER.Y  1 - CENTER.X 1 -
C.WINDOW PDOWNBOUNDS W@ SCROLL.WIDTH - 1-
C.WINDOW PRIGHTBOUNDS W@  SCROLL.WIDTH - 1-
O.TOOL.WIDTH MAX
SIDE.QUAD !RECT                      \ set cross.quadrant
SIDE.STRIP SIDE.QUAD SET.QUAD.STRIP          \ set id.strip
SIDE.QUAD SET.RULER.STRIP
SIDE.QUAD SET.TRANSLATION.CENTER           \ set center offset
;

: FRAME.RECT
  @RECT SWAP 2SWAP SWAP 2SWAP FRAME RECTANGLE ;


CODE TRANS.Q.POINTS
   SAVE.REGS
 ' ^ALLPOINTS  A2 )#MOVE,       \ a2 is ^ ^all.points
 A2 () A2 LONG MOVE,          \ a2 is ^allpoints
 A2 () A2 LONG MOVE,          \ a2 is allpoints

   A2 () D0 LONG MOVE,          \ d0 is number of cross.section points
   04 A2 I) D6 LONG MOVE,         \ d6 is number cross.sections
   D0 D6 MULS,               \ d6 is number of total points
   08 # A2 LONG ADDA,           \ add offset to data for all.points
 D6 01 LONG SUBQ,
 PL IF.L,
     BEGIN,
         A2 () D0 LONG MOVE,
           4 A2 I) D1 LONG MOVE,
           8 A2 I) D2 LONG MOVE,
     D2 PUSH, D1 PUSH, D0 PUSH,
     (SWIVEL),
     D0 POP, D1 POP, D2 POP,
     SCALER,
     D0 >NORMAL.SCALE,        \ scale for 2d Graphic
     D1 >NORMAL.SCALE,
     D2 >NORMAL.SCALE,
     FIX>INTEGER,
       D0  A2 )-  LONG MOVE,
           D1  A2 )+  LONG MOVE,
           D2  A2 )+  LONG MOVE,
     D6 LOOP,
 THEN,
   RESTORE.REGS
 NEXT END-CODE



: DRAW.1.QFRAME
   POLY.POINTS LOCALS| THE.POINTS
   SHADE.POINTS POLY.POINTS #POLY.POINTS @
   3POINT.LENGTH * CMOVE
     TWO.VECTOR  ZCROSS.PRODUCT  0 >
   CULL.BACK? @ OR IF
     #POLY.POINTS @ 1- 0 DO
       THE.POINTS  TO.STACK DROP
       Q.MOVE.TO
       THE.POINTS 12 + TO.STACK DROP
       Q.LINE.TO
       THE.POINTS 12 + TO THE.POINTS
     LOOP
     THE.POINTS TO.STACK DROP
     Q.MOVE.TO
```

-000642

```
    POLY.POINTS TO.STACK DROP
    Q.LINE.TO
  THEN ;

: QFRAME.ONE.SECTION
  0 SIDE !              \ side is the offset for the cross.section loop
  TRIANGLE.MESH? @ IF
     3 #POLY.POINTS !        \ set the number of points to four for the mesh
    AllPoints 4+ @ 1 DO
         SIDE @
      SECTION @ -
            AllPoints -  DUP      \ address of this point on this cross.section
      TO.TRI.1POINTS        \ write to shade points
            DRAW.1.QFRAME       \ draw the poly
      TO.TRI.2POINTS        \ write to shade points
            DRAW.1.QFRAME       \ draw the poly
            SIDE @
      3POINT.LENGTH + SIDE !     \ increment the cross.section offset
    LOOP
  ELSE
   4 #POLY.POINTS !          \ set the number of points to four for the mesh
    AllPoints 4+ @ 1 DO
         SIDE @
      SECTION @ +
            AllPoints +        \ address of this point on this cross.section
      TO.THE.POINTS
            DRAW.1.QFRAME       \ draw the poly
            SIDE @
      3POINT.LENGTH + SIDE !     \ increment the cross.section offset
         LOOP
  THEN ;

: QFRAME.FRONT.CAP           \ writes complex poly front cap if needed
  3POINT.LENGTH             \ length of point record
  AllPoints 8+ SECTION.INC @ 2* -   \ start of array
  LOCALS| THE.ALL OFF.POINT
  FRONT.CAP? @ IF            \ if we are using the cap...
     0 #POLY.POINTS !        \ set the start edge count to zero
     AllPoints 4+ @  0 DO       \ loop through the cross section
       THE.ALL
     OFF.POINT -          \ we are counting backward...
       >POLY.POINTS          \ write the the points
         OFF.POINT 3POINT.LENGTH -   \ increment the offset
     TO OFF.POINT
     LOOP                \ loop until done
 DRAW.1.QFRAME              \ draw the poly
 ELSE
   QFRAME.ONE.SECTION        \ else draw the current.section
 THEN ;

\ end cap

: QFRAME.END.CAP             \ writes complex poly end cap if needed
  0                 \ start at zero
  AllPoints 8+
  SECTION.INC @
  AllPoints @ 2- * +          \ the start address of the cross section for the cap
  LOCALS| THE.ALL OFF.POINT
  BACK.CAP? @ IF            \ if we are using the cap...
     0 #POLY.POINTS !        \ zero the edge count for the poly
     AllPoints 4+ @  0 DO       \ loop through the cross.section points
       THE.ALL
```

-000643

```
      OFF.POINT +           \ add start of the array to the offset
        >POLY.POINTS          \ write the points to shade and poly.points
           OFF.POINT 3POINT.LENGTH +  \ increment the offset
      TO OFF.POINT
      LOOP                  \ loop till done
    DRAW.1.QFRAME             \ draw the poly
  ELSE
    QFRAME.ONE.SECTION        \ else draw the current.section
  THEN ;


0 CONSTANT  ^QPOLY.FRAME


 : (NPOLY.QFRAME)              \ draws poly mesh object from AllPoints
    OBJECT.FORM PLUCK
      CASE
        PATH.FORM OF three.list ENDOF
      MESH.FORM OF GET.MESH ENDOF
     ENDCASE
    TRANS.Q.POINTS
      8 SECTION !             \ set start increment to first point in array
      AllPoints 4+ @            \ fetch count of points in a cross section
    3POINT.LENGTH *           \ * the point record length, is a length of a section
    SECTION.INC !
    AllPoints @ 2 > IF
      QFRAME.FRONT.CAP        \ test and do the front cap if needed,
      SECTION @ SECTION.INC @ -
      SECTION !           \ increment the pointer
      AllPoints @  3 DO       \ loop leaves out fron and end caps
          QFRAME.ONE.SECTION      \ draw the current cross.section
          SECTION @
        SECTION.INC @ + SECTION ! \ increment the path offset
        LOOP
      QFRAME.END.CAP          \ check for an end.cap and write if needed
      4 #POLY.POINTS !
    ELSE
    AllPoints @ 1 > IF
      QFRAME.FRONT.CAP        \ draw front.cap if just 2 path points
    THEN
  THEN
      ;

  FIND (NPOLY.QFRAME)  ' ^QPOLY.FRAME !

: QPOLY.FRAME ^QPOLY.FRAME EXECUTE ;


   VARIABLE CURRENT.QUAD.CHECK
   VARIABLE CURRENT.QUAD.XCHECK

    : CHECK.IN.QUAD
   OBJECT.STATE PLUCK IF
    CONTOUR CTYPE.RECORD
    CHECK.SUM
    CCONTOUR C.TYPE.LENGTH
    CHECK.SUM +
    CURRENT.QUAD.CHECK !
    CONTOUR CTYPE.RECORD
    CHECK.+SUM
    CCONTOUR C.TYPE.LENGTH
    CHECK.+SUM +
    CURRENT.QUAD.XCHECK !
   THEN  ;
```

-000644

```
: CHECK.OUT.QUAD
OBJECT.STATE PLUCK IF
 CONTOUR CTYPE.RECORD
 CHECK.SUM
 CCONTOUR C.TYPE.LENGTH
 CHECK.SUM +
 CURRENT.QUAD.CHECK @ =
 CONTOUR CTYPE.RECORD
 CHECK.+SUM
 CCONTOUR C.TYPE.LENGTH
 CHECK.+SUM +
 CURRENT.QUAD.XCHECK @ =
AND NOT
THEN ;


CREATE CIRCLE.RES  15 ,


\ grid drawing
create grid?         -1  ,
create measure       25  ,
create grid.inc#      5  ,
create object.change  0  ,


: Xmeasure.units>
  screen.to.measure 4+ @
  measure.scale
  */  ;


: >Xmeasure.units
  measure.scale
  screen.to.measure 4+ @
  */  ;


: Ymeasure.units>
  screen.to.measure @
  measure.scale
  */  ;


: >Ymeasure.units
  measure.scale
  screen.to.measure @
  */  ;


: XMEASURE.GRID
  measure.scale
  SCREEN.TO.MEASURE 4+ @  */
    DUP 0> IF
      DIV.UNITS 4+  @ *
      measure.scale 2/ +
      measure.scale  /
      measure.scale  *
      DIV.UNITS 4+  @ 2/ +
```

```
      DIV.UNITS 4+  @      /
    ELSE
      DIV.UNITS 4+  @ *
      measure.scale 2/ -
      measure.scale  /
      measure.scale  *
      DIV.UNITS 4+  @ 2/ -
      DIV.UNITS 4+  @      /
    THEN
  SCREEN.TO.MEASURE 4+ @
  measure.scale  */ ;


: YMEASURE.GRID
  measure.scale
  SCREEN.TO.MEASURE @  */
    DUP 0> IF
      DIV.UNITS  @ *
      measure.scale 2/ -
      measure.scale  /
      measure.scale  *
      DIV.UNITS  @ 2/ -
      DIV.UNITS  @  /
    ELSE
      DIV.UNITS  @ *
      measure.scale 2/ -
      measure.scale  /
      measure.scale  *
      DIV.UNITS  @ 2/ -
      DIV.UNITS  @  /
    THEN
  SCREEN.TO.MEASURE @
  measure.scale  */ ;


: POLAR.GRID              \ x y -- grids to polar coords
  ATT.GRID PLUCK
  5 MAX
  0 0  LOCALS| P.LENGTH  P.DELTA A.GRID P.X P.Y |
  P.X >Xmeasure.units TO P.X     \ transform to measure space
  P.Y >Ymeasure.units TO P.Y
  P.X DUP *
  P.Y DUP * + NSQRT         \ find length
    DIV.UNITS 4+ @ *        \ xgrid
    measure.scale 2/ -
    measure.scale  /
    measure.scale
    DIV.UNITS 4+ @ */
  TO P.LENGTH             \ grid the length to x units
  P.X P.Y
  ANGLE A.GRID 2/ +         \ find the angle and grid it
  A.GRID / A.GRID * TO P.DELTA
  P.DELTA SIN P.LENGTH
  COS.SCALER */             \ calculate x
  Xmeasure.units>           \ transform to screen units
  P.DELTA COS P.LENGTH
  COS.SCALER */             \ calculate y
  Ymeasure.units>  ;         \ transform to screen units


: @PGRIDXY              \ fetches mouse pos and aligns -- x y
```

–000646

I

```
Q.@MOUSEXY            \ fetch current mouse
USE.GRID? @ IF
POLAR.GRID              \ align both x and y
THEN ;

: @PGRID.DN             \ fetches mouse pos and aligns -- x y
Q.@MOUSE.DN           \ fetch  mouse down
USE.GRID? @ IF
POLAR.GRID              \ align both x and y
THEN ;

: (@GRIDXY)             \ fetches mouse pos and aligns -- x y
Q.@MOUSEXY            \ fetch current mouse
USE.GRID? @ IF
YMEASURE.GRID  SWAP        \ align both x and y
  XMEASURE.GRID  SWAP
THEN ;

: (@GRID.DN)            \ fetches mouse pos and aligns -- x y
Q.@MOUSE.DN           \ fetch last mouse down pos
USE.GRID? @ IF
YMEASURE.GRID  SWAP        \ align both x and y
  XMEASURE.GRID  SWAP
THEN ;

: @GRIDXY               \ -- xy in scaled, grided, quadrant space
   POLAR? @ IF
     @PGRIDXY
   ELSE
     (@GRIDXY)
   THEN  ;

: @GRID.DN              \ -- xy in scaled, grided, quadrant space
   POLAR? @ IF
     @PGRID.DN
   ELSE
     (@GRID.DN)
   THEN  ;

: C.TRANS
0 CURRENT.QUAD @ >TRANSLATE DROP ;

: 2>MEASURE
>YMEASURE.UNITS SWAP >XMEASURE.UNITS SWAP ;

 : 2MEASURE>
YMEASURE.UNITS> SWAP XMEASURE.UNITS> SWAP  ;

GLOBAL THE.INTY
GLOBAL THE.DIVY
GLOBAL THE.INTX
GLOBAL THE.DIVX

 : NICE.GRID
  measure.scale TO THE.INTY
```

-000647

```
  DIV.UNITS 4- @ TO THE.DIVY
  BEGIN
    THE.INTY
    SCREEN.TO.MEASURE @
    measure.scale  */
    CURRENT.QUAD @ +SCALE w@
    CURRENT.QUAD @ +SCALE.RANGE w@  */
    MIN.LETTER.SPACE < WHILE
    THE.INTY 2 *          \ increase grid size till large enough
    TO THE.INTY
  REPEAT                  \ clip the inc.units and set
  BEGIN
    THE.INTY THE.DIVY /
    SCREEN.TO.MEASURE @ measure.scale  */
      CURRENT.QUAD @ -SCALE w@
    CURRENT.QUAD @ +SCALE.RANGE w@  */
      MIN.PIX.SPACE < WHILE
    THE.DIVY 2/           \ increase grid size till large enough
    TO THE.DIVY
  REPEAT
  THE.DIVY 1 MAX TO THE.DIVY

  measure.scale TO THE.INTX
  DIV.UNITS @ TO THE.DIVX
  BEGIN
    THE.INTX
    SCREEN.TO.MEASURE 4+ @
    measure.scale  */
    CURRENT.QUAD @ +SCALE w@
    CURRENT.QUAD @ +SCALE.RANGE w@  */
    MIN.LETTER.SPACE < WHILE
    THE.INTX 2 *          \ increase grid size till large enough
    TO THE.INTX
  REPEAT                  \ clip the inc.units and set
  BEGIN
    THE.INTX THE.DIVX /
    SCREEN.TO.MEASURE 4+ @ measure.scale  */
      CURRENT.QUAD @ +SCALE w@
    CURRENT.QUAD @ +SCALE.RANGE w@  */
      MIN.PIX.SPACE < WHILE
    THE.DIVX 2/           \ increase grid size till large enough
    TO THE.DIVX
  REPEAT
  THE.DIVX 1 MAX TO THE.DIVX
   ;

: even.half
  THE.DIVY 2 MOD 0= IF
    THE.DIVY 2/ TO THE.DIVY
    THE.INTY 2/ TO THE.INTY
  THEN
  THE.DIVX 2 MOD 0= IF
    THE.DIVX 2/ TO THE.DIVX
    THE.INTX 2/ TO THE.INTX
  THEN ;

: r/
  dup 2/ rot + swap / ;

: YDIV.SIZE
  LOCALS| C.DIV |
  THE.DIVY 2 MOD IF
    1
```

-000648

```
  ELSE
    C.DIV THE.DIVY 2/ = IF
       4
    ELSE
       1
    THEN
  THEN ;


: XDIV.SIZE
  LOCALS| C.DIV |
  THE.DIVX 2 MOD IF
    1
  ELSE
    C.DIV THE.DIVX 2/ = IF
       4
    ELSE
       1
    THEN
  THEN ;


 : HGRID.LINE
     LOCALS|  CL CR THE.Y |
   THE.Y YMEASURE.UNITS> TO THE.Y
   CR CL
   THE.INTX /  THE.INTX * THE.INTX  - DO
     I XMEASURE.UNITS> THE.Y Q.DOT
     THE.DIVX 1 DO
       I  THE.INTX THE.DIVX */  J +
       XMEASURE.UNITS> THE.Y Q.DOT
     LOOP
   THE.INTX  +LOOP ;


: VGRID.LINE
    LOCALS|  CT CB THE.X |
    THE.X XMEASURE.UNITS> TO THE.X
    CB  CT
    THE.INTY /  THE.INTY  * THE.INTY  - DO
      I YMEASURE.UNITS> THE.X  SWAP Q.DOT
      THE.DIVY 1 DO
        I THE.INTY THE.DIVY */  J +
        YMEASURE.UNITS> THE.X  SWAP Q.DOT
      LOOP
    THE.INTY  +LOOP ;


   : (MGRID)
      8 PENMODE
      CURRENT.QUAD @ @RECT
      SWAP CURRENT.QUAD @ TRANSLATE>
      2>MEASURE SWAP 2SWAP
      SWAP CURRENT.QUAD @ TRANSLATE>
      2>MEASURE SWAP 2SWAP
      0 0 LOCALS| LXG LYG CR CB CL CT
    NICE.GRID
    even.half
    CR CL
    THE.INTX  / THE.INTX * DO
        I CB CT VGRID.LINE
    THE.INTX +LOOP
    CB CT
    THE.INTY /
```

-000649

```
   THE.INTY * DO
       I CR CL HGRID.LINE
   THE.INTY +LOOP  ;


 : (PGRID)                  \ draws polar grid
   ATT.GRID PLUCK
   8 PENMODE
   CURRENT.QUAD @ @RECT
   SWAP CURRENT.QUAD @ TRANSLATE>
   2>MEASURE SWAP 2SWAP
   SWAP CURRENT.QUAD @ TRANSLATE>
   2>MEASURE SWAP 2SWAP
   0 0 0 LOCALS| the.length LXG LYG CR CB CL CT A.GRID |
   NICE.GRID
   even.half
   CR 0 DO
   I to the.length
     FULL.ANGLE  0  DO
     DO.EVENTS DROP
     I COS the.length * COS.SCALER /
     I SIN the.length * COS.SCALER /
     2MEASURE> Q.DOT
   A.GRID  ANGLE.SCALE * +LOOP
   THE.INTY   +LOOP
    CR 0 DO
   THE.DIVY 0 DO
     THE.INTY  I THE.DIVY  */  J + to the.length
     FULL.ANGLE  0  DO
       I COS the.length * COS.SCALER /
       I SIN the.length * COS.SCALER /
        2MEASURE> Q.DOT
     A.GRID 2* ANGLE.SCALE * +LOOP
   LOOP
  THE.INTY +LOOP  ;


 : (grid)
     POLAR? @ IF
       (PGRID)
     ELSE
       (MGRID)
     THEN  ;


\ rulers for object design
\ Last Revision: 10/09/88  0:05:29 PM   YH
\ Draws horizontal and vertical rulers for the object quads
\ and updtates the hairline showing the cursor's position on the rule


 : H.                  \ x y n -- prints horizontally starting at xy
  LOCALS| THE.NUM THE.Y THE.X
  PAD 60 BLANKS
  THE.NUM PAD #>S!
  PAD C@ 0 DO
    THE.X 8 I * - THE.Y  (MOVE.TO)
    PAD 1+ I+ C@ draw.char
  LOOP  ;

 :  V.                 \ x y n -- prints vertically starting at xy
  LOCALS| THE.NUM THE.Y THE.X
  PAD 60 BLANKS
```

-000650

```
 THE.NUM PAD #>S!
 PAD C@ 0 DO
   THE.X THE.Y 10 I * + (MOVE.TO)
   PAD 1+ I+ C@ draw.char
 LOOP  ;


: >GTRANS               \ x y -- x y  translates to screen space
 2MEASURE>
 CURRENT.QUAD @ >TRANSLATE  ;



: HORIZ.RULE              \ draws horizontal ruler
   8 PENMODE
   4 textfont
   9 textsize
   NICE.GRID
   CURRENT.QUAD @ @RECT
   SWAP CURRENT.QUAD @ TRANSLATE>
   2>MEASURE SWAP 2SWAP
   SWAP CURRENT.QUAD @ TRANSLATE>
   2>MEASURE SWAP 2SWAP
    0 0 LOCALS| LXG LYG CR CB CL CT |
    CURRENT.QUAD @ @RECT
    TEMP.RECT !RECT
    TEMP.RECT  W@
    TEMP.RECT 4+ W!
    TEMP.RECT  W@ EXT RULE.WIDTH -
    TEMP.RECT  W!
   SAVE.CLIP >R
   TEMP.RECT CLIP.RECT
   TEMP.RECT @RECT
   1- SWAP 1- 2SWAP 2+ SWAP 2+ 2SWAP
   WHITE PATTERN RECTANGLE
   CR CL THE.INTX /  THE.INTX  * THE.INTX - DO
       I CT  >GTRANS 15 - (MOVE.TO)
     I CT  >GTRANS 5 -  (LINE.TO)
     I CT  >GTRANS 5 - SWAP 6 - SWAP
     I ABS measure.scale / H.
     THE.DIVX 1 DO
       THE.INTX I THE.DIVX */  J +
       CT  >GTRANS 15 - 2DUP (MOVE.TO)
       I XDIV.SIZE + (LINE.TO)
     LOOP
   THE.INTX  +LOOP
   R> RESTORE.CLIP ;



: VERT.RULE               \ draws a vertical ruler
   8 PENMODE
   4 textfont
   9 textsize
   CURRENT.QUAD @ @RECT
   SWAP CURRENT.QUAD @ TRANSLATE>
   2>MEASURE SWAP 2SWAP
   SWAP CURRENT.QUAD @ TRANSLATE>
   2>MEASURE SWAP 2SWAP
    0 0 LOCALS| LXG LYG CR CB CL CT
    CURRENT.QUAD @ @RECT
```

-000651

```
     TEMP.RECT !RECT
     TEMP.RECT 2+ W@
     TEMP.RECT 6+ W!
     TEMP.RECT 2+ W@ EXT RULE.WIDTH -
     TEMP.RECT 2+ W!
    SAVE.CLIP >R
    TEMP.RECT CLIP.RECT
    TEMP.RECT @RECT
    1- SWAP 1- 2SWAP 2+ SWAP 2+ 2SWAP
    WHITE PATTERN RECTANGLE
    NICE.GRID
    CB CT THE.INTY /  THE.INTY  * THE.INTY - DO
        C1 I  >GTRANS swap 15 - swap (MOVE.TO)
      C1 I  >GTRANS swap 5 - swap (LINE.TO)
      C1 I  >GTRANS swap 10 - swap : -
      I ABS measure.scale / V.
      THE.DIVY 1 DO
        THE.INTY I THE.DIVY  */  J -
        C1 SWAP  >GTRANS swap 15 - swap 2DUP (MOVE.TO)
        SWAP  I YDIV.SIZE + SWAP
        (LINE.TO)
      LOOP
    THE.INTY  +LOOP
    R> RESTORE.CLIP  ;

  : rule.box               \ draw the rule box
    CURRENT.QUAD @ @RECT
    locals| ql qb qr qt |
    qr rule.width - 1+
    qt rule.width - 1-
    qr 1+ qt 1+
    frame rectangle ;


  : DRAW.RULE.MARKS            \ high-level ruler mark drawing
    ^(DRAW.RULE.MARKS) EXECUTE ;

  : DO.RULE.TRACK            \ high-level ruler mark tracking
    ^(DO.RULE.TRACK) EXECUTE ;



  : SET.CURRENT.QUAD          \ point -- sets the current quad
    LOCALS| THE.POINT |
    THE.POINT CROSS.QUAD TEST.QUAD
    THE.POINT TOP.QUAD TEST.QUAD
    THE.POINT SIDE.QUAD TEST.QUAD
    THE.POINT WIRE.QUAD TEST.QUAD  ;


  : SET.RULE.RECT            \ sets the clip region to draw the rulers
    CURRENT.QUAD @ @RECT
    TEMP.RECT !RECT
    TEMP.RECT W@ EXT RULE.WIDTH -
    TEMP.RECT W!
    TEMP.RECT 2+ W@ EXT RULE.WIDTH -
    TEMP.RECT 2+ W!
    TEMP.RECT  ;

  : DRAW.MARKS              \ draws the ruler marks
    LOCALS| THE.Y THE.X
    10 PENMODE  GRAY PENPAT
    THE.X CURRENT.QUAD @ W@ EXT  (MOVE.TO)
    THE.X CURRENT.QUAD @ W@ EXT RULE.WIDTH -  (LINE.TO)
```

-000652

```
  CURRENT.QUAD @ 2+ W@ EXT THE.Y (MOVE.TO)
  CURRENT.QUAD @ 2+ W@ EXT RULE.WIDTH - THE.Y (LINE.TO)
  BLACK PENPAT ;


: (UNDRAW.RULE.MARKS)        \ undraws the last ruler marks
  LAST.RULE.POINT POINT>XY
  LOCALS| THE.Y THE.X |
  LAST.QUAD IF
    SAVE.CLIP >R
    CURRENT.QUAD @ >R
    LAST.QUAD CURRENT.QUAD !
    LAST.RULE.RECT CLIP.RECT
    THE.X THE.Y DRAW.MARKS
    R> CURRENT.QUAD !
    R> RESTORE.CLIP
  THEN ;


: (DRAW.RULE.MARKS)          \ draws new marks and undraws old
  10 PENMODE
  GRAY PENPAT
  CURRENT.QUAD @ >TRANSLATE
  2DUP XY>POINT
  LOCALS| THE.POINT THE.Y THE.X
  RULERS? IF
    THE.POINT LAST.RULE.POINT = NOT IF
    SAVE.CLIP >R
    CURRENT.QUAD @ >R
    THE.POINT SET.CURRENT.QUAD
    SET.RULE.RECT CLIP.RECT
    THE.X THE.Y  DRAW.MARKS
    (UNDRAW.RULE.MARKS)
    THE.POINT TO LAST.RULE.POINT
    TEMP.RECT @RECT LAST.RULE.RECT !RECT
    CURRENT.QUAD @ TO LAST.QUAD
    R> CURRENT.QUAD !
    R> RESTORE.CLIP
    THEN
  THEN
  BLACK PENPAT ;


FIND (DRAW.RULE.MARKS) ' ^(DRAW.RULE.MARKS) !


: (DO.RULE.TRACK)            \ EVENTS -- EVENTS
  LOCALS| THE.EVENTS
  THE.EVENTS 0= IF
    @MOUSE POINT>XY
    CURRENT.QUAD @  TRANSLATE>
    DRAW.RULE.MARKS
  THEN THE.EVENTS ;


FIND (DO.RULE.TRACK) ' ^(DO.RULE.TRACK) !
```

-000653

```
: DRAW.RULERS              \ draws horizontal and vertical rules
  SAVE.CLIP >R
  GET.WINDOW 16+ CLIP.RECT
  8 PENMODE
  HORIZ.RULE
  VERT.RULE
```

```
    RULE.BOX
    R> RESTORE.CLIP  ;


: SET.YGRAPHIC.UNITS
  GRAPHIC.SCALE
  SCREEN.TO.MEASURE !
  10 DIV.UNITS  ! ;


: SET.XGRAPHIC.UNITS
  GRAPHIC.SCALE
  SCREEN.TO.MEASURE 4+ !
  10 DIV.UNITS 4+ !  ;


: SET.YMEASURE.UNITS
    FIX.SCREEN.TO.MEASURE @
    GRAPHIC.SCALE NORMAL.SCALE */
    decimal.scale /
    SCREEN.TO.MEASURE !        \ convert the screen.to.measure
    FIX.MEASURE.DIV  @
    DIV.UNITS ! ;


: SET.XMEASURE.UNITS
    FIX.SCREEN.TO.MEASURE @
    GRAPHIC.SCALE NORMAL.SCALE */
    decimal.scale /
    SCREEN.TO.MEASURE 4+ !      \ convert the screen.to.measure
    FIX.MEASURE.DIV  @
    DIV.UNITS 4+ !  ;


SET.YMEASURE.UNITS
SET.XMEASURE.UNITS
.


: PATH.EDIT.GRID
  CURRENT.QUAD @ WIRE.QUAD = IF
    SET.XMEASURE.UNITS
    SET.YMEASURE.UNITS
  ELSE
    OBJECT.FORM.EDIT PLUCK
    CASE
      EXTRUSION.FORM.EDIT OF
        CURRENT.QUAD @ CROSS.QUAD = IF
          SET.XMEASURE.UNITS
          SET.YMEASURE.UNITS
        ELSE
          SET.XMEASURE.UNITS
          SET.YGRAPHIC.UNITS
        THEN
      ENDOF
      LATHE.FORM.EDIT OF
        CURRENT.QUAD @ CROSS.QUAD = IF
          SET.XGRAPHIC.UNITS
          SET.YGRAPHIC.UNITS
        ELSE
          SET.XMEASURE.UNITS
          SET.YMEASURE.UNITS
        THEN
      ENDOF
    ENDCASE
```

-000654

T

```
  THEN ;

: (NICE.GRID.LINES)              \ sets grids to usable sizes
  PATH.EDIT.GRID ;

FIND (NICE.GRID.LINES) CONSTANT  MAKE.NICE.GRID

   : CROSS.HAIR
    10 penmode
    CURRENT.QUAD @ cross.quad =
    CURRENT.QUAD @ wire.quad  = or IF
      -40 0 Q.MOVE.TO 40 0 Q.LINE.TO
      0 -40 Q.MOVE.TO 0 40  Q.LINE.TO
    else
      -120 0 Q.MOVE.TO 120 0 Q.LINE.TO
      0 -40 Q.MOVE.TO 0 40  Q.LINE.TO
    then
     ;

   :  GRID                \ draws the grid and the rules
    make.nice.grid execute
    CURRENT.QUAD @
      @RECT
      SWAP 2SWAP SWAP 2SWAP
      4DUP
      WHITE PATTERN RECTANGLE
      FRAME RECTANGLE
    RULERS? IF
      DRAW.RULERS
    THEN
    CURRENT.QUAD @
    FULL.QUAD @ = IF
      ^DRAW.TRACE.PICT EXECUTE
    THEN
    GRID? @ IF
      (grid)
    THEN
    Cross.Hair
    LAST.QUAD CURRENT.QUAD @ = IF
      0 TO LAST.QUAD
    THEN  ;

    create symetry  -1 ,
    create side     -1 ,
    create top      -1 ,
```

```
\ reflectance and color of object

 0 CONSTANT ^DO.COLOR.PALETTE

 : (DO.PALETTE)
   ^DO.COLOR.PALETTE EXECUTE   ;

 : DO.PALETTE
   @MOUSE.DN POINT>XY SELECT.OBJECT? NOT IF
     WORLD.OBJECT SET.CURRENT.OBJECT
   THEN
   @MOUSE (DO.PALETTE)
   REVERT.V.TOOL ;
```

```
CR

." Loading Render Menu "

 ANEW RENDER.MENU.STUFF


 : INIT.RENDER
  0
  0 204 ResString       \ " Effects "
  RENDER.MENO NEW.MENU
  1 204 ResString       \ " Open Tween Panel;Open Light Panel;-("
  RENDER.MENO APPEND.ITEMS
  2 204 ResString       \ " Effects.../G;Effects Render/H;-(;Remap Color;Select Color/J;-(;"
  RENDER.MENO APPEND.ITEMS
  3 204 ResString       \ " Set Key/1;Add Key/2;Clear Key/3;Next Key/4;Last Key/5"
  RENDER.MENO APPEND.ITEMS
  4 204 ResString       \ " Tween/T;Preview/Y"
  RENDER.MENO APPEND.ITEMS ;

  : RENDER.MENU.ON
    0 TRUE RENDER.MENO ITEM.ENABLE ;

  : RENDER.MENU.OFF
    0 FALSE RENDER.MENO ITEM.ENABLE ;


  5 204 CreateResString open.tweenS \ " Open Tween Panel"
  6 204 CreateResString close.tweenS  \ " Close Tween Panel"
  7 204 CreateResString open.lightS \ " Open Light Panel"
  8 204 CreateResString close.lightS  \ " Close Light Panel"


  : Set-upRenderMenu
    LIGHT.WINDOW ?ACTIVE.WPTR NOT IF
      2 OPEN.LIGHTS RENDER.MENO SET.ITEMS
     ELSE
      2 CLOSE.LIGHTS RENDER.MENO SET.ITEMS
    THEN
    TWEENING.WINDOW ?ACTIVE.WPTR NOT IF
      1 OPEN.TWEENS RENDER.MENO SET.ITEMS
     ELSE
      1 CLOSE.TWEENS RENDER.MENO SET.ITEMS
    THEN ;

  : HANDLE.TWEEN.MENU
    TWEENING.WINDOW ?ACTIVE.WPTR IF
      TWEENING.WINDOW CLOSE.DIALOG
      1 OPEN.TWEENS RENDER.MENO SET.ITEMS
     ELSE
      ASCII DLOG 5002 GET.RESOURCE IF
      5002 TWEENING.WINDOW ADD.DIALOG
      THEN
      1 CLOSE.TWEENS RENDER.MENO SET.ITEMS
    THEN ;

  : HANDLE.LIGHT.MENU
    LIGHT.WINDOW ?ACTIVE.WPTR IF
      LIGHT.WINDOW CLOSE.dialog
     ELSE
      RESET.LIGHT
    THEN ;
```

-000657

```
: RENDER.MENU.SELECT
  RENDER.MENO MENU.SELECTION:
  CASE
    1 OF   HANDLE.TWEEN.MENU ENDOF
    2 OF     HANDLE.LIGHT.MENU ENDOF
    4 OF   DO.TWEEN.EFFECTS  ENDOF
      5 OF   DO.EFFECTS.RENDER ENDOF
    7 OF   ENTER.WORLD.RGB
       AddWorldMaterials        \ convert dem mats
       do.error.alert
       INIT.WINDOW.PALETTE
       WORLD.OBJECT SET.CURRENT.OBJECT
       REDRAW.OBJECT
       DISPLAY.WORLD ENDOF
   8  OF   200 100 xy>point
       (DO.PALETTE)  ENDOF
  10  OF   SET.KEY.FRAME ENDOF
  11  OF   ADD.KEY.FRAME
       DISPLAY.TWEEN.PANEL ENDOF
  12  OF   DELETE.KEY.FRAME
       DISPLAY.TWEEN.PANEL ENDOF
  13  OF   NEXT.KEY.FRAME
       DISPLAY.TWEEN.PANEL ENDOF
  14  OF   LAST.KEY.FRAME
       DISPLAY.TWEEN.PANEL ENDOF
  15  OF   DO.VIEW.TWEEN  ENDOF
  16  OF   TWEEN.FAST.VIEW ENDOF
 ENDCASE
 0 HILITE.MENU  ;
```

I

```
variable temp.string 256 allot

: ResString
  0 0 2 locals| str.pointer the.string the.res res.id strn
  0 temp.string c!
  ascii STR# res.id Get.Resource
  to the.res
  the.res if
    strn 0 > if
      strn the.res @ W@ 1 - min to strn
      strn 0 do
        str.pointer the.res handle.size <  if
          str.pointer dup
          the.res @ + c@ + 1+ to str.pointer
        then
      loop
    then
    str.pointer the.res handle.size < if
      str.pointer the.res @ +
      to the.string
      the.string temp.string 255 cmove
    then
  then
  temp.string ;


: PrintResString
  0 0 2 locals| str.pointer the.string the.res res.id strn
  0 temp.string c!
  ascii STR# res.id Get.Resource
  to the.res
  the.res if
    strn 0 > if
      strn the.res @ W@ 1 - min to strn
      strn 0 do
        str.pointer the.res handle.size <  if
          str.pointer dup
          the.res @ + c@ + 1+ to str.pointer
        then
      loop
    then
    str.pointer the.res handle.size < if
      str.pointer the.res @ +
      to the.string
      the.string temp.string 255 cmove
    then
  then
  temp.string count type ;


: CreateResString
  locals| theid theN |
  CREATE
  theN ,
  theid ,
    DOES>
  dup @
  swap 4+ @
  ResString
;
```

-000659

I

6/1/90 20:05 Ruler.Panel Page 1

```
\ ruler dialog

ANEW --RULER.PANEL.2--


\ new object records ---  OBJECT.MEASURE.REF


  HEX
    6112 CONSTANT CM.PICT
    6113 CONSTANT PIXEL.PICT
    6114 CONSTANT INCH.PICT

  DECIMAL


5548  NEW.DIALOG.RECORD

   1 MAKE.ACTIVE.ITEM    Ruler.Ok
   2 MAKE.ACTIVE.ITEM    Ruler.Cancel
   3 MAKE.PICT.ITEM      Ruler.Top.Pict
   4 MAKE.PICT.ITEM      Ruler.Bottom.Pict
   5 MAKE.RADIO.ITEM     Ruler.Inch
   6 MAKE.RADIO.ITEM     Ruler.Cm
   7 MAKE.RADIO.ITEM     Ruler.Pixel
   8 MAKE.RADIO.ITEM     Inch.Scale
   9 MAKE.RADIO.ITEM     Foot.Scale
  10 MAKE.RADIO.ITEM     Mile.Scale
  11 MAKE.RADIO.ITEM     Cm.Scale
  12 MAKE.RADIO.ITEM     M.Scale
  13 MAKE.RADIO.ITEM     Km.Scale
  14 MAKE.RADIO.ITEM     Pixel.Scale
  15 MAKE.TEXT.ITEM      Ruler.Units
  16 MAKE.TEXT.ITEM      Scale.Units
  17 MAKE.TEXT.ITEM      Division.Units
  19 MAKE.CHECK.ITEM     Set.All.Ruler
  20 MAKE.PICT.ITEM      Ruler.Arrow

 NAME.DIALOG.RECORD RULER.PANEL

  1 ITEM.BANK.OF Inch.Scale :
  1 ITEM.BANK.OF Foot.Scale :
  1 ITEM.BANK.OF Mile.Scale :
  1 ITEM.BANK.OF Cm.Scale :
  1 ITEM.BANK.OF M.Scale :
  1 ITEM.BANK.OF Km.Scale :
  1 ITEM.BANK.OF Pixel.Scale :


  : PUT.OBJECT.MEASURE
     Ruler.Inch @ if
        0  OBJECT.MEASURE.REF PLACE THEN
    Ruler.CM @ if
        1  OBJECT.MEASURE.REF PLACE THEN
    Ruler.PIXEL @ if
        2   OBJECT.MEASURE.REF PLACE THEN  ;


  : (SET.SCREEN.MEASURE)
    0 LOCALS| THE.MEASURE
    Ruler.Inch @ if
```

-000660

```
     INCH.CONVERT TO THE.MEASURE THEN
  Ruler.CM @ if
     CENTI.CONVERT TO THE.MEASURE THEN
  Ruler.PIXEL @ if
     SCREEN.CONVERT TO THE.MEASURE THEN
  THE.MEASURE
  Ruler.Units MEASURES>MEASURE 1 MAX
  decimal.scale */  TO THE.MEASURE
  THE.MEASURE
  decimal.scale
  Scale.Units MEASURES>MEASURE 1 MAX
   */  TO THE.MEASURE
  THE.MEASURE  ;

: SET.SCREEN.MEASURE
  (SET.SCREEN.MEASURE) OBJECT.MEASURE.TO.SCREEN PLACE  ;


: PUT.MEASURE.SCALE
  Inch.Scale @ IF 0 OBJECT.MEASURE.SCALE PLACE  THEN
  Foot.Scale @ IF 1 OBJECT.MEASURE.SCALE PLACE  THEN
  Mile.Scale @ IF 2 OBJECT.MEASURE.SCALE PLACE  THEN
  Cm.Scale   @ IF 3 OBJECT.MEASURE.SCALE PLACE  THEN
  M.Scale    @ IF 4 OBJECT.MEASURE.SCALE PLACE  THEN
  Km.Scale   @ IF 5 OBJECT.MEASURE.SCALE PLACE  THEN
  Pixel.Scale @ IF 6 OBJECT.MEASURE.SCALE PLACE  THEN
  Ruler.Units MEASURES>MEASURE 1 MAX OBJECT.RULER.UNIT PLACE
  Scale.Units MEASURES>MEASURE 1 MAX OBJECT.SCALE.UNIT PLACE ;


: PUT.MEASURE.DIVISIONS
  0 LOCALS| THE.DIV |
  Division.Units
    NNUMBER 1 MAX TO THE.DIV
  THE.DIV OBJECT.MEASURE.DIV PLACE  ;


: PUT.RULER.PANEL
  PUT.OBJECT.MEASURE
  PUT.MEASURE.SCALE
  PUT.MEASURE.DIVISIONS
  SET.SCREEN.MEASURE
  OBJECT.CHANGED
  OBJECT.MEASURE.TO.SCREEN PLUCK       \ fetch object grid and measure to globals
   FIX.SCREEN.TO.MEASURE !
    OBJECT.MEASURE.DIV  PLUCK
    FIX.MEASURE.DIV !
  ;


: GET.OBJECT.MEASURE
   OBJECT.MEASURE.REF PLUCK 0   IF
        1 Ruler.Inch ! ELSE
        0 Ruler.Inch ! THEN
  OBJECT.MEASURE.REF PLUCK 1 = IF
        1 Ruler.CM ! ELSE
        0 Ruler.CM ! THEN
  OBJECT.MEASURE.REF PLUCK 2 = IF
        1 Ruler.PIXEL ! ELSE
        0 Ruler.PIXEL ! THEN   ;


: GET.MEASURE.SCALE
  OBJECT.MEASURE.SCALE PLUCK 0   IF
```

-000661

```
        1 Inch.Scale ! ELSE
        0 Inch.Scale ! THEN
   OBJECT.MEASURE.SCALE PLUCK 1 = IF
        1 Foot.Scale ! ELSE
        0 Foot.Scale ! THEN
   OBJECT.MEASURE.SCALE PLUCK 2 = IF
        1 Mile.Scale ! ELSE
        0 Mile.Scale ! THEN
   OBJECT.MEASURE.SCALE PLUCK 3 = IF
        1 Cm.Scale ! ELSE
        0 Cm.Scale ! THEN
   OBJECT.MEASURE.SCALE PLUCK 4 = IF
        1 M.Scale ! ELSE
        0 M.Scale ! THEN
   OBJECT.MEASURE.SCALE PLUCK 5 = IF
        1 KM.Scale ! ELSE
        0 KM.Scale ! THEN
   OBJECT.MEASURE.SCALE PLUCK 6 = IF
        1 Pixel.Scale ! ELSE
        0 Pixel.Scale ! THEN
   OBJECT.RULER.UNIT PLUCK  Ruler.Units
   CLEAR.STRING MEASURE>MEASURES!
   OBJECT.SCALE.UNIT PLUCK  Scale.Units
   CLEAR.STRING MEASURE>MEASURES!  ;


 : GET.MEASURE.DIVISIONS
    OBJECT.MEASURE.DIV PLUCK
    Division.Units CLEAR.STRING #>S!  ;


 GLOBAL THE.INT
 GLOBAL THE.DIV
 GLOBAL THE.CONVERT


  : NICE.GRID.PANEL
   BEGIN
     THE.INT
     the.convert
     decimal.scale  */
       decimal.scale /
     MIN.LETTER.SPACE < WHILE
     THE.INT 2 *            \ increase grid size till large enough
     TO THE.INT
   REPEAT                 \ clip the inc.units and set
   BEGIN
     THE.INT THE.DIV /
     THE.CONVERT  decimal.scale  */
       decimal.scale /
       MIN.PIX.SPACE < WHILE
     THE.DIV 2/             \ increase grid size till large enough
     TO THE.DIV
   REPEAT
   THE.DIV 1 MAX TO THE.DIV  ;

 : r/
   dup 2/ rot + swap / ;


: DIV.SIZE
  LOCALS| C.DIV |
  THE.DIV 2 MOD IF
    4
```

-000662

```
 ELSE
   C.DIV THE.DIV 2/ = IF
      7
   ELSE
     4
   THEN
 THEN ;

: R.                    \ x y n -- prints horizontally starting at xy
 LOCALS| THE.NUM THE.Y THE.X |
 PAD 60 BLANKS
 THE.NUM PAD #>$!
 PAD C@ 0 DO
   THE.X 8 I 1+ * +
   TEMP.RECT 6+ W@ < if           \ clip to temp.rect
     THE.X 8 I * + THE.Y  (MOVE.TO)
     PAD 1+ I+ C@ draw.char
   THEN
 LOOP  ;


: (DRAW.PANEL.RULE)
   TEMP.RECT 2+ W@ TEMP.RECT 4- W@ (MOVE.TO)
   TEMP.RECT 6+ W@ TEMP.RECT 4- W@ (LINE.TO)
   TEMP.RECT 6+ W@  decimal.scale *
   decimal.scale  the.convert */  0 DO
     I the.convert  * decimal.scale  /
     decimal.scale /
     dup TEMP.RECT 4+ W@ (MOVE.TO)
     dup TEMP.RECT 4- W@ 15 - (LINE.TO)
     4 + TEMP.RECT 4+ W@ 10 - I
     decimal.scale /  R.
     THE.DIV 1 DO
       THE.INT I THE.DIV */  J +
       the.convert  * decimal.scale  /
       decimal.scale r/
           DUP TEMP.RECT 6+ W@ < if
             dup TEMP.RECT 4- W@ (MOVE.TO)
               TEMP.RECT 4+ W@
             I DIV.SIZE - (LINE.TO)
           ELSE DROP THEN
     LOOP
   THE.INT  +LOOP ;


: (DRAW.BOTTOM.RULER)
   (SET.SCREEN.MEASURE) TO THE.CONVERT
   Division.Units
     NNUMBER 1 MAX TO THE.DIV
   decimal.scale TO THE.INT
   NICE.GRID.PANEL
   1 20 pensize
   white penpat
   4 textfont
   9 textsize
   8 penmode
   TEMP.RECT 2+ W@ 0 (MOVE.TO)
   TEMP.RECT 6+ W@ 0 (LINE.TO)
   1 1 pensize
   black penpat
   (DRAW.PANEL.RULE)  ;


 : DRAW.BOTTOM.RULER
```

-000663

```
Ruler.Bottom.Pict @ @ 2- @RECT
TEMP.RECT !RECT
Ruler.Bottom.Pict @ PURGABLE
TEMP.RECT OPEN.PICTURE Ruler.Bottom.Pict !
1 1 PENSIZE
BLACK PENPAT
8 PENMODE
(DRAW.BOTTOM.RULER)
CLOSE.PICTURE ;


: (DRAW.RULER.ARROW)
LOCALS| THE.X |
Ruler.Arrow @ @ 2+ @RECT
TEMP.RECT !RECT
Ruler.Arrow @ PURGABLE
TEMP.RECT OPEN.PICTURE Ruler.Arrow !
1 16 PENSIZE
WHITE PENPAT
0 0 (MOVE.TO)
TEMP.RECT 6+ W@ EXT 0 (LINE.TO)
1 1 PENSIZE
8 PENMODE
BLACK PENPAT
  THE.X 2  (MOVE.TO)
THE.X 14 (LINE.TO)
THE.X 3 - 8 (LINE.TO)
THE.X 14 (MOVE.TO)
THE.X 3 + 8 (LINE.TO)
CLOSE.PICTURE ;


: draw.ruler.arrow
 Ruler.Inch @ if
  INCH.CONVERT
  Ruler.Units MEASURES>MEASURE
  decimal.scale */
  decimal.scale /
  (DRAW.RULER.ARROW)
THEN
Ruler.CM @ if
    CENTI.CONVERT
    Ruler.Units MEASURES>MEASURE
  decimal.scale */
  decimal.scale /
    (DRAW.RULER.ARROW)
THEN
Ruler.PIXEL @ if
    SCREEN.CONVERT
    Ruler.Units MEASURES>MEASURE
    decimal.scale  */
    decimal.scale /
  (DRAW.RULER.ARROW)
THEN ;
```

-000664

```
: SET.RULER.PICTS
  0 LOCALS| THE.PICT |
    Ruler.Inch @ if
    INCH.PICT TO THE.PICT THEN
  Ruler.CM @ if
    CM.PICT TO THE.PICT THEN
```

```
     Ruler.PIXEL @ if
       PIXEL.PICT TO THE.PICT THEN
    THE.PICT IF
     THE.PICT GET.PICTURE TO THE.PICT
       THE.PICT IF
         THE.PICT Ruler.Top.Pict !
         THE.PICT Ruler.BOTTOM.Pict !
       THEN
     THEN
   draw.ruler.arrow
   DRAW.BOTTOM.RULER ;


 : GET.RULER.PANEL
   GET.OBJECT.MEASURE
   GET.MEASURE.SCALE
   GET.MEASURE.DIVISIONS
   SET.RULER.PICTS ;


: R.BYE
   LOCALS; C.ITEM HIT.ITEM C.RECORD
     DROP 1   ;

     FIND R.BYE RULER.CANCEL !



: SET.ONE.RULER
    DEFAULT.SCREEN.TO.MEASURE @
    OBJECT.MEASURE.TO.SCREEN PLACE
    DEFAULT.RULER.UNIT @
    OBJECT.RULER.UNIT place
    DEFAULT.SCALE.UNIT @
    OBJECT.SCALE.UNIT place
    DEFAULT.MEASURE.SCALE @
    OBJECT.MEASURE.SCALE PLACE
    DEFAULT.MEASURE.REF @
    OBJECT.MEASURE.REF PLACE
    DEFAULT.MEASURE.DIV @
    OBJECT.MEASURE.DIV PLACE
    OBJECT.CHANGED ;

  FIND SET.ONE.RULER CONSTANT ^SET.ONE.RULER

  : SET.RULER.GLOBAL
    OBJECT.MEASURE.TO.SCREEN PLUCK
      DEFAULT.SCREEN.TO.MEASURE !
    OBJECT.RULER.UNIT PLUCK
    DEFAULT.RULER.UNIT !
      OBJECT.SCALE.UNIT PLUCK
      DEFAULT.SCALE.UNIT !
      OBJECT.MEASURE.SCALE PLUCK
      DEFAULT.MEASURE.SCALE !
    OBJECT.MEASURE.REF PLUCK
    DEFAULT.MEASURE.REF !
      OBJECT.MEASURE.DIV PLUCK
    DEFAULT.MEASURE.DIV !
      CURRENT.OBJECT @ >R
    WORLD.OBJECT SET.CURRENT.OBJECT
    OPERATION @ >R
    ^SET.ONE.RULER OPERATION !
```

-000665

```
    TRAVERSE.DOWN.TREE
    R> OPERATION :
    R> SET.CURRENT.OBJECT ;


 : R.SAVE
    LOCALS| C.ITEM HIT.ITEM C.RECORD |
    RULER.PANEL GET.ITEM.DATA
    PUT.RULER.PANEL
    Set.All.Ruler @ IF
      SET.RULER.GLOBAL
    THEN ;

   FIND R.SAVE Ruler.Ok !


  1 Set.All.Ruler !


: CHECK.UPDATE
  LOCALS| THE.HIT |
  THE.HIT 4 >
  THE.HIT 8 < and if
    RULER.PANEL GET.ITEM.DATA
    SET.RULER.PICTS
    ruler.panel SET.ITEMS
    DGET draw.dialog
  then ;


: DO.RULER.PANEL
  RULER.PANEL
     LOCALS|  C.DIALOG |
    CURRENT.OBJECT @ WORLD.OBJECT = IF
      1 Set.All.Ruler !
    THEN
    0 LAST.RADIO.ITEM !          \ init radio global
      C.DIALOG DIALOG.OF INIT.DIALOG     \ open dialog window , push dialog.ptr on stack
    C.DIALOG GET.ITEMS           \ fetch item handles
    GET.RULER.PANEL            \ fetch the things
    C.DIALOG SET.ITEMS           \ set booleans and text
    BEGIN
      DO.MODAL.DIALOG          \ handle modal events
      DUP C.DIALOG HANDLE.ITEMS   \ handle item events
      DUP CHECK.UPDATE
    1 = UNTIL                \ until ok
    C.DIALOG GET.ITEM.DATA         \ fetch new data to record
      QUIT.DIALOG              \ end of dialog
    in.object.drawing @ if
      discard.activates
      DISPLAY.QUADS
    then ;
```

```
6/1/90 20:05                    Save.Envir                    Page 1

\ Save.Envir...saves the current state of various things in the
\ swivel environment

anew --swiv.envir--


global ^current.evir.res
0 to ^current.evir.res
ascii SENV  constant Swiv.Envir.Type
128 constant Swiv.Envir.ID


Structure SwivEnvir
  3 LONGS: +REL.LIGHT.VECTOR
  3 LONGS: +LIGHT.VECTOR
  LONG:  +MONOCHROME
  LONG:  +SHADOW.SCALE
  LONG:  +CONTRAST.RANGE
  LONG:  +OBJECT.CONTRAST
  LONG:  +FASTCUBE
  LONG:  +ORTHOGRAPHIC
  LONG:  +GLOBAL.RENDER
  LONG:  +DIRECT.LIGHT
  LONG:  +REFLECTED.LIGHT
  LONG:  +KEY.COUNT
  LONG:  +LOOP.TWEEN
  LONG:  +CDIST
  9 LONGS:  +SWIV.PAD
Structure.End


: put.swiv.envir
  REL.LIGHT.VECTOR ^current.evir.res @ +REL.LIGHT.VECTOR 12 CMOVE
  LIGHT.VECTOR ^current.evir.res @ +LIGHT.VECTOR 12 CMOVE
  monochrome? ^current.evir.res @  +monochrome !
  SHADOW.SCALE ^current.evir.res @  +SHADOW.SCALE !
  CONTRAST.RANGE ^current.evir.res @  +CONTRAST.RANGE !
  OBJECT.CONTRAST ^current.evir.res @  +OBJECT.CONTRAST !
  FASTCUBE? ^current.evir.res @  +FASTCUBE !
  ORTHOGRAPHIC @ ^current.evir.res @  +ORTHOGRAPHIC !
  GLOBAL.RENDER @ ^current.evir.res @  +GLOBAL.RENDER !
  100 ^current.evir.res @  +DIRECT.LIGHT !
  80 ^current.evir.res @  +REFLECTED.LIGHT !
  KEY.COUNT @ ^current.evir.res @  +KEY.COUNT !
  LOOP.TWEEN? @ ^current.evir.res @  +LOOP.TWEEN !
  CDISTANCE @ ^current.evir.res @  +CDIST !
  ^current.evir.res @  +SWIV.PAD 36 ERASE ;



: get.swiv.envir
  ^current.evir.res @  +monochrome @ to monochrome?
  ^current.evir.res @  +SHADOW.SCALE @ ' SHADOW.SCALE  !
  ^current.evir.res @  +CONTRAST.RANGE @ ' CONTRAST.RANGE !
  ^current.evir.res @  +OBJECT.CONTRAST @ to OBJECT.CONTRAST
  ^current.evir.res @  +FASTCUBE @ to FASTCUBE?
  ^current.evir.res @  +ORTHOGRAPHIC @ ORTHOGRAPHIC !
  ^current.evir.res @  +GLOBAL.RENDER @ GLOBAL.RENDER !
  ^current.evir.res @  +KEY.COUNT @ KEY.COUNT !
  ^current.evir.res @  +LOOP.TWEEN @ LOOP.TWEEN? !
  ^current.evir.res @  +CDIST @ CDISTANCE !
  CDISTANCE @ 0 = IF
    700 FIX.SCALE SCALE CDISTANCE !
```

-000667

```
  THEN
  CDISTANCE @ FIX.SCALE NEG SCALE CDISTINT !
  0 CURRENT.KEY ! ;


: default.swiv.envir
    0 to monochrome?
  COLOR.SCALE 3 / ' SHADOW.SCALE  !
  COLOR.SCALE ' CONTRAST.RANGE !
  60 to OBJECT.CONTRAST
  0 to FASTCUBE?
  0 ORTHOGRAPHIC !
  -1 GLOBAL.RENDER !
  0 KEY.COUNT !
  0 LOOP.TWEEN? !
  0 CURRENT.KEY !
  700 CDISTINT !
  700 FIX.SCALE SCALE CDISTANCE !
  SET.DEFAULT.CLIP.PLANE  ;


: Attach.Envir
  ^current.evir.res if
    ^current.evir.res
    Swiv.Envir.Type
    Swiv.Envir.ID
    nil.name
    add.resource
    res.error ?dup if
      to Error.Flag
    then
  then ;


: Load.Envir
  Swiv.Envir.Type Swiv.Envir.ID
  GET1RESOURCE TO ^current.evir.res
  ^current.evir.res if
    get.swiv.envir
  else
    default.swiv.envir
    SwivEnvir from.min.heap
    to ^current.evir.res
    ^current.evir.res if
      put.swiv.envir
      Attach.Envir
    then
  then  ;


: Delete.Envir
  ^current.evir.res if
    ^current.evir.res to.heap
    0 to ^current.evir.res
  then ;


: Detach.Envir
  ^current.evir.res if
    put.swiv.envir
    ^current.evir.res CHANGED.RESOURCE
    update.resources
    ^current.evir.res detach.resource
  then ;
```

-000668

I

6/1/90 20:05 Scale.Control Page 1

```
\ variable control for scaling

anew -scale.control-

cr ." Loading Scale Control"
create scale.rect 8 allot

 : MOVE/UNCLICK                \ Loops until move or click
   @MOUSE
     BEGIN
       DUP @MOUSE = NOT        \ if not - its a move
     MOUSE.BUTTON NOT OR       \ mouse.button or move for ending loop
     UNTIL  DROP ;            \ drop the packed point


: set.scale.rect
   0 locals| b.range range.rect the.scale
   range.rect w@ scale.rect w!
   range.rect 4 + w@ 1- scale.rect 4 + w!
   range.rect 6 + w@ range.rect 2 + w@ - 10 -
   to b.range
   the.scale @  b.range *
   cos.scaler 2 / +
   cos.scaler /
   range.rect 2 + w@ + 5 - to b.range
   b.range 4 - scale.rect 2 + w!
   b.range 4 + scale.rect 6 + w!
  ;

: set.scale.var
  0 locals| b.range range.rect the.scale the.x
   range.rect 6 + w@ range.rect 2 + w@ -
   to b.range
   the.x range.rect 2 + w@ -
   0 max b.range min
   cos.scaler * b.range 2/ +
   b.range /
   the.scale ! ;


: draw.scale.indicator
  10 penmode
  scale.rect 2 + w@
  scale.rect 4 + w@ (move.to)
  scale.rect 2 + w@
  scale.rect 6 + w@ + 2/
  scale.rect w@      (line.to)
  scale.rect 6 + w@
  scale.rect 4 + w@ (line.to)
  scale.rect 2 + w@
  scale.rect 4 + w@ (line.to)
  8 penmode ;


: UpdateScaleControl
  locals| range.rect the.scale
  10 penmode
  the.scale
  range.rect
  set.scale.rect
  draw.scale.indicator
  8 penmode ;
```

-000670

T

```
: handle.scale.control
  0 locals| the.hit range.rect the.scale
  10 penmode
  the.scale
  range.rect
  set.scale.rect
  @mouse scale.rect ptinrect if
    draw.scale.indicator
    begin
      @mouse
      point>xy drop
      the.scale
      range.rect
      set.scale.var
      the.scale
      range.rect
      set.scale.rect
      draw.scale.indicator
      move/unclick
      draw.scale.indicator
    mouse.button not until
    true to the.hit
    draw.scale.indicator
  then
  8 penmode
  the.hit ;
```

```
\ shade menu

CR ." Loading Shade Menu ..."



 : INIT.SHADE          \ menu in order of shading types in system globals
    0
    9 204 ResString       \ " Render "
     SHADE.MENO NEW.MENU
  10 204 ResString      \ "   Resize Work Space...;  Render separately ;  Orthographic;  Fast Cubes"
  SHADE.MENO APPEND.ITEMS
  11 204 ResString      \ " -(; ^1 Wireframe; ^2 Hidden Line; ^3 Outline Shade; ^4 Shade; ^5 Smooth;("
    SHADE.MENO APPEND.ITEMS
     ;

  : SHADE.MENU.ON
    0 TRUE SHADE.MENO ITEM.ENABLE ;

  : SHADE.MENU.OFF
    0 FALSE SHADE.MENO ITEM.ENABLE ;


 : TOGGLE.GLOBAL.RENDER
   GLOBAL.RENDER @ IF
    0 GLOBAL.RENDER !
    WORLD.OBJECT SET.CURRENT.OBJECT
    REDRAW.OBJECT
    DISPLAY.WORLD
   ELSE
    -1 GLOBAL.RENDER !
    WORLD.OBJECT SET.CURRENT.OBJECT
    OBJECT.RENDER PLUCK
    RENDER.MODE !
    REDRAW.OBJECT
    DISPLAY.WORLD
   THEN ;


 : TOGGLE.ORTHOGRAPHIC
   ORTHOGRAPHIC @ NOT ORTHOGRAPHIC !
   WORLD.OBJECT SET.CURRENT.OBJECT
   REDRAW.OBJECT
   DISPLAY.WORLD  ;


  : TOGGLE.FASTCUBE
  FASTCUBE? NOT TO FASTCUBE?
  WORLD.OBJECT SET.CURRENT.OBJECT
  REDRAW.OBJECT
  DISPLAY.WORLD  ;


  :  DO.WORLD.SHADE
     CURRENT.OBJECT @ >R
     WORLD.OBJECT SET.CURRENT.OBJECT
     RENDER.MODE @
     OBJECT.RENDER PLUCK - NOT IF
       RENDER.MODE @ OBJECT.RENDER PLACE
       OBJECT.CHANGED
       GET.OBJECT
```

-000672

```
      REDRAW.OBJECT
      DISPLAY.WORLD
    THEN
    R>  SET.CURRENT.OBJECT ;

  : DO.OBJECT.SHADE
    CURRENT.OBJECT @ WORLD.OBJECT = NOT IF
    RENDER.MODE @
    OBJECT.RENDER PLUCK = NOT IF
      RENDER.MODE @ OBJECT.RENDER PLACE
      OBJECT.CHANGED
      GET.OBJECT
      REDRAW.JUST.ONE
    THEN
      DISPLAY.WORLD
    THEN ;

 : HANDLE.RESIZE.BACKPORT
  0 0 LOCALS| BUFFY BUFFX |
  DO.ZBUFF.PANEL
  TO BUFFY
  TO BUFFX
  ZBUFFERY @ BUFFY =
  ZBUFFERX @ BUFFX = AND
  NOT IF
    BUFFX BUFFY RESIZE.BACKPORT
    WORLD.OUTPUT WINDOW
    0 0 XYOFFSET
    ZBUFFERX @ 2/ XOFFSET !
    ZBUFFERY @ 2/ YOFFSET !             \ set offsets for display
    SET.VIEW.LIMITS
    INIT.WINDOW.PALETTE
    WORLD.OBJECT SET.CURRENT.OBJECT
    REDRAW.OBJECT
    DISPLAY.WORLD
  THEN ;


 : DO.SHADE.MENU
  LOCALS| SHADE.REPLY |
  SHADE.REPLY 5 < IF
    SHADE.REPLY CASE
    1 OF HANDLE.RESIZE.BACKPORT ENDOF
    2 OF TOGGLE.GLOBAL.RENDER ENDOF
    3 OF TOGGLE.ORTHOGRAPHIC ENDOF
    4 OF TOGGLE.FASTCUBE ENDOF
    ENDCASE
  ELSE
    SHADE.REPLY 4 - RENDER.MODE !
    GLOBAL.RENDER @ IF
      DO.WORLD.SHADE
    ELSE
      DO.OBJECT.SHADE
    THEN
  THEN
  0 HILITE.MENU ;


 : SHADE.MENU.SELECT
  SHADE.MENO MENU.SELECTION:
  DO.SHADE.MENU  ;


: SetupShadeMenu
```

-000673

```
2 GLOBAL.RENDER @ 0= SHADE.MENO ITEM.CHECK
3 ORTHOGRAPHIC  @ SHADE.MENO ITEM.CHECK
4 FASTCUBE? SHADE.MENO ITEM.CHECK
;
```

6/1/90 20:05 ShadeEdit Page 1

```
\ edit the shader for a material

anew -shaderedit-

612 MakeSwapOver DO.SHADE.EDIT

StartSwapOver

  16600 constant SHADEPICTOFFSET
  8222 NEW.DIALOG.RECORD

   1 MAKE.ACTIVE.ITEM  SHADEDIT.OK
   2 MAKE.ACTIVE.ITEM  SHADEDIT.CANCEL
   3 MAKE.ACTIVE.ITEM  SHADEDIT.SLIDE1
   4 MAKE.ACTIVE.ITEM  SHADEDIT.SLIDE2
   5 MAKE.ACTIVE.ITEM  SHADEDIT.SLIDE3
   6 MAKE.ACTIVE.ITEM  SHADEDIT.SLIDE4
   7 MAKE.TEXT.ITEM  SHADEDIT.NAME
   8 MAKE.TEXT.ITEM  SHADEDIT.VAR1
   9 MAKE.TEXT.ITEM  SHADEDIT.VAR2
   10 MAKE.TEXT.ITEM   SHADEDIT.VAR3
   11 MAKE.TEXT.ITEM   SHADEDIT.VAR4
   12 MAKE.ACTIVE.ITEM SHADEDIT.OPACITY
   13 MAKE.ACTIVE.ITEM SHADEDIT.PICT
   20 MAKE.TEXT.ITEM   SHADEDIT.T1
   21 MAKE.TEXT.ITEM   SHADEDIT.T2
   22 MAKE.TEXT.ITEM   SHADEDIT.T3
   23 MAKE.TEXT.ITEM   SHADEDIT.T4
   24 MAKE.TEXT.ITEM   SHADEDIT.T5

  NAME.DIALOG.RECORD SHADE.EDIT

   create Varslide1 1000 ,
   create Varslide2 1000 ,
   create Varslide3 1000 ,
   create Varslide4 1000 ,
   create Opslide   1000 ,
   create shadeChanged  0 ,

   create Range1 0 ,
   create Range2 0 ,
   create Range3 0 ,
   create Range4 0 ,

  : set.slide.text
   locals| textrec N range |
   N 1000 cos.scaler */ range *
   textrec ITEM.STRING - CLEAR.STRING
   MEASURE>MEASURES!
   textrec dup ITEM.SET.TOKEN - @ execute ;


  : GET.SHADE.EDIT
   0 0 locals| theRec shadeID
   ASCII ZSHD
   CurrentMaterial @ +ShaderIndex @ 1 -
   Get.Resource to shadeID
   shadeID if

     shadeID pad dup SHADEDIT.NAME get.res.info
     CurrentMaterial @ +ShaderVar1 @ Varslide1 !
     CurrentMaterial @ +ShaderVar2 @ Varslide2 !
     CurrentMaterial @ +ShaderVar3 @ Varslide3 !
     CurrentMaterial @ +ShaderVar4 @ Varslide4 !
```

-000675

```
  CurrentMaterial @ +Opacity @ Opslide !

  shadeID 0 GetShaderRec to theRec
  theRec @ Range1 !
  theRec 8 + SHADEDIT.VAR1 theRec 8 + c@ 1+ 40 min cmove
  shadeID 1 GetShaderRec to theRec
  theRec @ Range2 !
  theRec 8 + SHADEDIT.VAR2 theRec 8 + c@ 1+ 40 min cmove
  shadeID 2 GetShaderRec to theRec
  theRec @ Range3 !
  theRec 8 + SHADEDIT.VAR3 theRec 8 + c@ 1+ 40 min cmove
  shadeID 3 GetShaderRec to theRec
  theRec @ Range4 !
  theRec 8 + SHADEDIT.VAR4 theRec 8 + c@ 1+ 40 min cmove
then
;


: PUT.SHADE.EDIT
 Varslide1 @ CurrentMaterial @ +ShaderVar1 !
 Varslide2 @ CurrentMaterial @ +ShaderVar2 !
 Varslide3 @ CurrentMaterial @ +ShaderVar3 !
 Varslide4 @ CurrentMaterial @ +ShaderVar4 !
 Opslide @ CurrentMaterial @ +Opacity !
 ;


: shadeok
 LOCALS| C.ITEM HIT.ITEM C.RECORD
   SHADE.EDIT GET.ITEM.DATA
   PUT.SHADE.EDIT ;

   FIND shadeok SHADEDIT.OK !


 : UpdateOpacity
 Opslide
 ' SHADEDIT.Opacity item.rect +
 UpdateScaleControl
 1 Opslide @ ' SHADEDIT.T1 set.slide.text ;

: S.BYE
   LOCALS| C.ITEM HIT.ITEM C.RECORD
     DROP 1   ;

      FIND S.BYE SHADEDIT.CANCEL !

: Do.Opacity
 0 LOCALS| THE.RECT C.ITEM HIT.ITEM C.RECORD
 Opslide
 ' SHADEDIT.Opacity item.rect +
 handle.scale.control if
   -1 shadeChanged !
   1 Opslide @ ' SHADEDIT.T1 set.slide.text
 then  ;

 find Do.Opacity SHADEDIT.Opacity !


: UpdateSlide1
 VarSlide1
 ' SHADEDIT.SLIDE1 item.rect +
 UpdateScaleControl
 Range1 @ Varslide1 @ ' SHADEDIT.T2 set.slide.text  ;
```

-000676

```
: Do.Slide1
  0 LOCALS| THE.RECT C.ITEM HIT.ITEM C.RECORD
  VarSlide1
  ' SHADEDIT.SLIDE1 item.rect +
  handle.scale.control if
    -1 shadeChanged !
    Range1 @  Varslide1 @ ' SHADEDIT.T2 set.slide.text
  then  ;

  find Do.Slide1 SHADEDIT.SLIDE1 !

 : Updateslide2
  Varslide2
  ' SHADEDIT.slide2 item.rect +
  UpdateScaleControl
  Range2 @  Varslide2 @ ' SHADEDIT.T3 set.slide.text  ;


: Do.slide2
  0 LOCALS| THE.RECT C.ITEM HIT.ITEM C.RECORD
  Varslide2
  ' SHADEDIT.slide2 item.rect +
  handle.scale.control if
    -1 shadeChanged !
    Range2 @ Varslide2 @ ' SHADEDIT.T3 set.slide.text
  then  ;

  find Do.slide2 SHADEDIT.slide2 !

 : Updateslide3
  Varslide3
  ' SHADEDIT.slide3 item.rect +
  UpdateScaleControl
  Range3 @ Varslide3 @ ' SHADEDIT.T4 set.slide.text ;


: Do.slide3
  0 LOCALS| THE.RECT C.ITEM HIT.ITEM C.RECORD
  Varslide3
  ' SHADEDIT.slide3 item.rect +
  handle.scale.control if
    -1 shadeChanged !
    Range3 @ Varslide3 @ ' SHADEDIT.T4 set.slide.text
  then  ;

  find Do.slide3 SHADEDIT.slide3 !


 : Updateslide4
  Varslide4
  ' SHADEDIT.slide4 item.rec  +
  UpdateScaleControl
  Range4 @ Varslide4 @ ' SHADEDIT.T5 set.slide.text ;


: Do.slide4
  0 LOCALS| THE.RECT C.ITEM HIT.ITEM C.RECORD
  Varslide4
  ' SHADEDIT.slide4 item.rect +
  handle.scale.control if
    -1 shadeChanged !
    Range4 @ Varslide4 @ ' SHADEDIT.T5 set.slide.text
```

-000677

```
  then  ;

  find Do.slide4 SHADEDIT.slide4 !

: UpdatePicture
  0 locals| thepict |
  CurrentMaterial @ +ShaderIndex @
  SHADEPICTOFFSET +
  Get.Picture to thepict
  thepict if
    thepict
    ' SHADEDIT.PICT item.rect +
    draw.picture
  then
;

: (DO.SHADE.EDIT)
    SHADE.EDIT
    get.window
    LOCALS| the.win C.DIALOG
    0 LAST.RADIO.ITEM !          \ init radio global
    C.DIALOG DIALOG.OF INIT.DIALOG    \ open dialog window , push dialog.ptr on stack
    C.DIALOG GET.ITEMS           \ Fetch item handles
    GET.SHADE.EDIT
    C.DIALOG SET.ITEMS           \ set boleans and text
    C.DIALOG HANDLE.ITEMS        \ handle item events
    dget (window)
    UpdateSlide1
    UpdateSlide2
    UpdateSlide3
    UpdateSlide4
    UpdateOpacity
    UpdatePicture
    BEGIN
      DO.MODAL.DIALOG          \ handle modal events
        DUP C.DIALOG HANDLE.ITEMS    \ handle item events
    1 = UNTIL                \ until ok
    C.DIALOG GET.ITEM.DATA         \ fetch new data to record
      QUIT.DIALOG              \ end of dialog
    the.win window
  ;

SetSwapOverToken
EndSwapOver
```

-000678

I

6/1/90 20:05 ShadePanel Page 1

```
\ edit the shader for a material

anew -shaderpanel-

611 MakeSwapOver DO.SHADER.PANEL

StartSwapOver


  7027 NEW.DIALOG.RECORD

  1 MAKE.ACTIVE.ITEM  SHADE.OK
  2 MAKE.ACTIVE.ITEM  SHADE.CANCEL
  3 MAKE.RADIO.ITEM   SHADE0
  4 MAKE.RADIO.ITEM   SHADE1
  5 MAKE.RADIO.ITEM   SHADE2
  6 MAKE.RADIO.ITEM   SHADE3
  7 MAKE.RADIO.ITEM   SHADE4
  8 MAKE.RADIO.ITEM   SHADE5
    9 MAKE.RADIO.ITEM   SHADE6
   10 MAKE.RADIO.ITEM   SHADE7
   11 MAKE.RADIO.ITEM   SHADE8
   12 MAKE.RADIO.ITEM   SHADE9

 NAME.DIALOG.RECORD SHADER.PANEL


 hex
 Code SetCTitle
    A95F w,
 next end-code
 decimal


 : SetShaderName
  0 locals| theSHAD id dialogRec
  0 dialogRec ITEM.BOOL + !
  ASCII ZSHD id Get.Resource to theSHAD
  theSHAD if
     dialogRec ITEM.HANDLE + @
     theSHAD pad dup temp.string get.res.info
         temp.string SetCTitle
     dialogRec ITEM.HANDLE + @ 0
     HiLite.Control
  else
     dialogRec ITEM.HANDLE + @ 255
     HiLite.Control
  then
 ;


 : GET.SHADER.PANEL
  ' SHADE0 1 SetShaderName
  ' SHADE1 2 SetShaderName
  ' SHADE2 3 SetShaderName
  ' SHADE3 4 SetShaderName
  ' SHADE4 5 SetShaderName
  ' SHADE5 6 SetShaderName
  ' SHADE6 7 SetShaderName
  ' SHADE7 8 SetShaderName
  ' SHADE8 9 SetShaderName
  ' SHADE9 10 SetShaderName
```

-000679

```
 SHADER.PANEL
   CurrentShader @ 2 +
   ITEM.RECORD.OF @ NEXT.PTR +
   ITEM.BOOL +
   1 swap !
 ;


: PUT.SHADER.PANEL
 0 locals| theshad |
 LAST.RADIO.ITEM @ 0 = not if
   CurrentShader @
   LAST.RADIO.ITEM @ 3 - = not if
     LAST.RADIO.ITEM @ 3 -
     CurrentShader !
     ASCII ZSHD CurrentShader @ 1- Get.Resource to theSHAD
     theSHAD if
       theSHAD pad dup
       currentmaterial @ -MaterialName
       get.res.info
     then
     SetShaderDefaults
   then
 then ;

: S.BYE
   LOCALS| C.ITEM HIT.ITEM C.RECORD
     DROP 1   ;

      FIND S.BYE SHADE.CANCEL '

: SHADE.SAVE
   LOCALS| C.ITEM HIT.ITEM C.RECORD
   SHADER.PANEL GET.ITEM.DATA
   PUT.SHADER.PANEL ;

   FIND SHADE.SAVE SHADE.OK !



: (DO.SHADER.PANEL)
   SHADER.PANEL
   LOCALS| C.DIALOG |
   0 LAST.RADIO.ITEM !          \ init radio global
   C.DIALOG DIALOG.OF INIT.DIALOG    \ open dialog window , push dialog.ptr on stack
   C.DIALOG GET.ITEMS           \ fetch item handles
   GET.SHADER.PANEL
   C.DIALOG SET.ITEMS           \ set booleans and text
   C.DIALOG HANDLE.ITEMS        \ handle item events
   BEGIN
     DO.MODAL.DIALOG          \ handle modal events
       DUP C.DIALOG HANDLE.ITEMS    \ handle item events
   1 = UNTIL                  \ until ok
   C.DIALOG GET.ITEM.DATA         \ fetch new data to record
     QUIT.DIALOG              \ end of dialog
 ;

SetSwapOverToken
EndSwapOver
```

-000680

```
6/1/90 20:06                    SKIN.TREE                         Page 1

\ skin a tree of contours as a form
\ still need to do bounding errors on maximum size of resulting mesh

ANEW -SKIN.TREE.5-


GLOBAL MAX.CCONTOUR.POINTS
GLOBAL ^SKIN.POINTS
GLOBAL ^SKIN.COUNT
GLOBAL CCONTOUR.COUNT
GLOBAL ROOT.OBJECT
GLOBAL LEAF.OBJECT


  : TEST.MAX.CCONTOUR         \ tests for maximum number of cross.section points
    OBJECT.FORM PLUCK
    PATH.FORM = IF
      GET.OBJECT
      CCONTOUR.COUNT CONTOUR @ 4/ -
      TO CCONTOUR.COUNT
      CCONTOUR @ MAX.CCONTOUR.POINTS > IF
        CCONTOUR @ TO MAX.CCONTOUR.POINTS
      THEN
      CURRENT.OBJECT @ TO LEAF.OBJECT
    THEN  ;


  : SET.MAX.TREE.CCONTOUR       \ finds max number of cross section points for tree
    CURRENT.OBJECT @  OPERATION @
    LOCALS| C.OPERATION C.OBJECT
    TOKEN.FOR TEST.MAX.CCONTOUR
    OPERATION !
    0 TO CCONTOUR.COUNT
    0 TO MAX.CCONTOUR.POINTS
    TRAVERSE.DOWN.TREE
    C.OBJECT SET.CURRENT.OBJECT
    C.OPERATION OPERATION !
    MAX.CCONTOUR.POINTS 4/
    TO MAX.CCONTOUR.POINTS ;


  GLOBAL FIRST.POINTER
  GLOBAL SECOND.POINTER
  GLOBAL 1.SKIN.ERROR
  GLOBAL 2.SKIN.ERROR
  GLOBAL DEST.POINTER
  GLOBAL THE.ALL
  GLOBAL ALL.COUNT
  GLOBAL SKIN.COUNT


  VARIABLE AVERAGE.POINT 3POINT.LENGTH ALLOT


 : WRITE.SKIN.SECTION
  CCONTOUR.COUNT MAX.TYPE.POINTS < IF
  SKIN.COUNT  0 DO
      I  ALL.COUNT   *  SKIN.COUNT  /
     TO FIRST.POINTER
     I  ALL.COUNT   *
     FIRST.POINTER SKIN.COUNT   * -
     TO 2.SKIN.ERROR
```

-000681

```
      FIRST.POINTER 1+
      TO SECOND.POINTER
      SECOND.POINTER ALL.COUNT   MIN
      TO SECOND.POINTER
      FIRST.POINTER 3POINT.LENGTH *  THE.ALL +
      TO FIRST.POINTER
      SECOND.POINTER 3POINT.LENGTH * THE.ALL +
      TO SECOND.POINTER
      ^SKIN.POINTS ^SKIN.COUNT + I 3POINT.LENGTH * +
      TO DEST.POINTER
      SKIN.COUNT   2.SKIN.ERROR -
      TO 1.SKIN.ERROR

      FIRST.POINTER @
      1.SKIN.ERROR SKIN.COUNT   */
      SECOND.POINTER @
      2.SKIN.ERROR SKIN.COUNT   */ +
      DEST.POINTER !

      FIRST.POINTER 4+ @
      1.SKIN.ERROR SKIN.COUNT   */
      SECOND.POINTER 4+ @
      2.SKIN.ERROR SKIN.COUNT   */ +
      DEST.POINTER 4+ !

      FIRST.POINTER 8+ @
      1.SKIN.ERROR SKIN.COUNT   */
      SECOND.POINTER 8+ @
      2.SKIN.ERROR SKIN.COUNT   */ +
      DEST.POINTER 8+ !
    LOOP
    ALL.COUNT  3POINT.LENGTH *  THE.ALL +
    TO FIRST.POINTER
    ^SKIN.POINTS ^SKIN.COUNT + SKIN.COUNT 3POINT.LENGTH * +
    TO DEST.POINTER
    FIRST.POINTER DEST.POINTER 3POINT.LENGTH CMOVE
    ^SKIN.COUNT MAX.CCONTOUR.POINTS + TO ^SKIN.COUNT
  THEN
  CCONTOUR.COUNT 1- TO CCONTOUR.COUNT  ;


  : INC.SKIN.SECTION
      THE.ALL AllPoints 4+ @  3POINT.LENGTH * + TO THE.ALL
    ;

  : DEC.SKIN.SECTION
      THE.ALL AllPoints 4+ @  3POINT.LENGTH * - TO THE.ALL
    ;

GLOBAL SKIN.DIRECTION
1 TO SKIN.DIRECTION

: THREE.CONTOUR<SKIN.POINTS
  MAX.CCONTOUR.POINTS 3POINT.LENGTH / 1- to SKIN.COUNT
  AllPoints 4+ @ 1- to ALL.COUNT
    AllPoints 8 +
  AllPoints @ 1-
  Allpoints 4+ @ *
  3POINT.LENGTH * + to THE.ALL
  CURRENT.OBJECT @ ROOT.OBJECT = IF
    WRITE.SKIN.SECTION
  THEN
    DEC.SKIN.SECTION
  CURRENT.OBJECT LEAF.OBJECT = NOT IF
```

-000682

I

```
    AllPoints @  3 MAX
  ELSE
    AllPoints @  2 MAX
  THEN
  2 DO
    WRITE.SKIN.SECTION
    DEC.SKIN.SECTION
  LOOP
  CURRENT.OBJECT @ LEAF.OBJECT =
  AllPoints @  2 > AND  IF
    WRITE.SKIN.SECTION
  THEN
  ;

: THREE.CONTOUR>SKIN.POINTS
  MAX.CCONTOUR.POINTS 3POINT.LENGTH / 1- to SKIN.COUNT
  AllPoints 4+ @ 1- to ALL.COUNT
    AllPoints 8 +  to THE.ALL
  CURRENT.OBJECT @ ROOT.OBJECT = IF
    WRITE.SKIN.SECTION
  THEN
    INC.SKIN.SECTION
  CURRENT.OBJECT LEAF.OBJECT = NOT IF
    AllPoints @  3 MAX
  ELSE
    AllPoints @  2 MAX
  THEN
  2 DO
    WRITE.SKIN.SECTION
    INC.SKIN.SECTION
  LOOP
  CURRENT.OBJECT @ LEAF.OBJECT
  AllPoints @  2 > AND  IF
    WRITE.SKIN.SECTION
  THEN
  ;

: THREE.CONTOUR.SKIN.POINTS
  SKIN.DIRECTION 1 = IF
    THREE.CONTOUR>SKIN.POINTS
  ELSE
    THREE.CONTOUR<SKIN.POINTS
  THEN ;


  CODE TRANS.ALL.SKIN.POINTS
    SAVE.REGS
  ' ^AllPoints  A2 )#MOVE,       \ a2 is ^ ^AllPoints
  A2 () A2 LONG MOVE,          \ A2 IS ^ALLPOINTS
  A2 () A2 LONG MOVE,          \ A2 IS ALLPOINTS
    A2 () D0 LONG MOVE,          \ d0 is number of cross.section points
    04 A2 I) D6 LONG MOVE,         \ d6 is number cross.section
    D0 D6 MULS,               \ d6 is number of total points
    08 # A2 LONG ADDA,           \ add offset to data for AllPoints
  D6 01 LONG SUBQ,
  PL IF.L,
      BEGIN,
          A2 () D0 LONG MOVE,
            4 A2 I)  D1 LONG MOVE,
            8 A2 I)  D2 LONG MOVE,
      D2 PUSH, D1 PUSH, D0 PUSH,
      (CENTER),
      (SWIVEL),
```

-000683

```
    D0 POP, D1 POP, D2 POP,
    SCALER,
      OUT,
      D0  A2 )+  LONG MOVE,
          D1  A2 )+  LONG MOVE,
          D2  A2 )+  LONG MOVE,
    D6 LOOP,
THEN,
  RESTORE.REGS
NEXT END-CODE


: ADD.SKIN.SECTION
  ROOT.OBJECT CURRENT.OBJECT @ = NOT IF
    SET.ABSOLUTE
  THEN
  GET.OBJECT
  OBJECT.FORM PLUCK
  PATH.FORM = IF
    CCONTOUR.COUNT MAX.TYPE.POINTS < IF
      THREE.LIST
      TRANS.ALL.SKIN.POINTS
      THREE.CONTOUR.SKIN.POINTS
    THEN
  THEN  ;


: SET.ABSOLUTE.TREE
  CURRENT.OBJECT @  OPERATION @
  LOCALS| C.OPERATION C.OBJECT
  TOKEN.FOR SET.ABSOLUTE
  OPERATION !
  TRAVERSE.DOWN.TREE
  C.OBJECT SET.CURRENT.OBJECT
  C.OPERATION OPERATION ! ;


: TRAVERSE.TREE.SKIN
  CURRENT.OBJECT @  OPERATION @
  LOCALS| C.OPERATION C.OBJECT
  TOKEN.FOR ADD.SKIN.SECTION
  OPERATION !
  0 TO CCONTOUR.COUNT
  0 TO ^SKIN.COUNT
  TRAVERSE.DOWN.TREE
  C.OBJECT SET.CURRENT.OBJECT
  C.OPERATION OPERATION ! ;


: SET.SKIN.DIRECTION        \ sets direction for reading in object's cross sections
  CURRENT.OBJECT @
  0 LOCALS| THE.FLAG THE.OBJECT
  1 TO SKIN.DIRECTION
  BEGIN
    DOWN.TREE PLUCK SET.CURRENT.OBJECT
    CURRENT.OBJECT @ THE.END = NOT
    CURRENT.OBJECT @ WORLD.OBJECT > AND
    IF
      OBJECT.FORM PLUCK PATH.FORM = IF
        OBJECT.R3POS PLUCK
        >R 2DROP R> 0> IF
          0 TO SKIN.DIRECTION
        THEN
```

-000684

I

```
      -1 TO THE.FLAG
     THEN
   THEN
     THE.FLAG CURRENT.OBJECT @ THE.END = OR
 UNTIL
 THE.OBJECT SET.CURRENT.OBJECT ;


: SKIN.TREE
 0  0 LOCALS| NEW.MESH SKIN.HANDLE
 CURRENT.OBJECT @  TO ROOT.OBJECT
 SET.SKIN.DIRECTION
 ROOT.OBJECT WORLD.OBJECT >
 OBJECT.FORM PLUCK
 PATH.FORM = AND IF
 SET.MAX.TREE.CCONTOUR
 MAX.CCONTOUR.POINTS
 MAX.TYPE.POINTS  MIN
 3POINT.LENGTH *
 DUP TO MAX.CCONTOUR.POINTS
 CCONTOUR.COUNT
 MAX.TYPE.POINTS  MIN *
 FROM.MIN.HEAP TO SKIN.HANDLE
 SKIN.HANDLE HANDLE.SIZE 0 > IF
   SKIN.HANDLE @ TO ^SKIN.POINTS
   SKIN.HANDLE LOCK.HANDLE
   ROOT.OBJECT SET.CURRENT.OBJECT
   0 YAW 0 PITCH 0 ROL
   COSINES OBJECT.ACOS MOVE.RECORD
   0 0 0 OBJECT.A3POS PLACE
   SCALE.RANGE OBJECT.SCALE PLACE
   TRAVERSE.TREE.SKIN
   NEW.OBJECT
   CURRENT.OBJECT @ TO NEW.MESH
   NEW.MESH WORLD.OBJECT > IF
     ^SKIN.POINTS AllPoints 8 ·
     SKIN.HANDLE HANDLE.SIZE
     MAX.TYPE.POINTS DUP *
     3POINT.LENGTH * MIN CMOVE
     SKIN.HANDLE UNLOCK.HANDLE
     SKIN.HANDLE TO.HEAP
     CCONTOUR.COUNT MAX.TYPE.POINTS MIN
     AllPoints !
     MAX.CCONTOUR.POINTS 3POINT.LENGTH /
     AllPoints 4+ !
     SKIN.DIRECTION 0 = IF
       INSIDE/OUTPOINTS
     THEN
     PUT.MESH
     TRIANGLE.MESH.BIT
     OBJECT.FORM.RENDER PLACE
     CUT.OBJECT                \ cut out child
     ROOT.OBJECT
     UP.TREE  PLACE             \ place new parent
           INSERT.OBJECT              \ insert child
     GLOBAL.LINK W@             \ set link type
     LINK.TYPE PLACE
     OBJECT.CHANGED
     CCONTOUR.COUNT MAX.TYPE.POINTS > IF
       10 SYSBEEP
     THEN
   ELSE
     -108 TO ERROR.FLAG
```

-000685

```
      DO.ERROR.ALERT
    THEN
    ROOT.OBJECT SET.CURRENT.OBJECT
    SET.ABSOLUTE.TREE
    NEW.MESH WORLD.OBJECT > IF
      NEW.MESH SET.CURRENT.OBJECT
      DRAW.OBJECT
    THEN
  ELSE
    -108 TO ERROR.FLAG
    DO.ERROR.ALERT
  THEN
  ELSE
    10 SYSBEEP
  THEN ;


\ to make the poly list objects out of ordinary trees


global poly.object


: ADD.POLY.POINTS
  CURRENT.OBJECT @
  0 LOCALS| OLD.SIZE the.ob
  the.ob poly.object = not if
    poly.object set.current.object
    ERROR.FLAG 0= IF
      CURRENT.HANDLE HANDLE.SIZE TO OLD.SIZE
      #POLY.POINTS @ 3point.length * 2- OLD.SIZE +
      RESIZE.RES.RECORD IF
        #POLY.POINTS @
        CURRENT.HANDLE @ OLD.SIZE + 2- W!
        SHADE.POINTS
        CURRENT.HANDLE @ OLD.SIZE +
        #POLY.POINTS @ 3point.length * CMOVE
        0 CURRENT.HANDLE @
        CURRENT.HANDLE HANDLE.SIZE + 2- W!
      ELSE
        -108 TO ERROR.FLAG
      THEN
    then
  then
  the.ob set.current.object ;


: create.poly.list.object
  current.object @
  alt.poly @
  orthographic @
  locals| the.orth the.alt the.ob                 \ locals
    0 to error.flag                          \ reset error
    new.object                               \ create a new object
    current.object @ to poly.object               \ set the local
    poly.object world.object > if                 \ if it a real object...
      poly.form object.form place             \ set it as a poly object
      ' object.type @ 2+                     \ set the size
      resize.res.record if
        0 object.type drop w!                \ set the count
        token.for add.poly.points alt.poly !  \ to add the polys
        orthographic on                      \ set orthographic
        the.ob set.current.object             \ set the tree to copy
```

-000686

```
        draw.tree
        the.orth orthographic !
        the.alt alt.poly !
        error.flag 0= if
          poly.object set.current.object     \ set the poly object as current
          CULL.BACK.BIT              \ no backplane cull
          OBJECT.FORM.RENDER PLACE       \ set attributes
          set.relative
          ^delete.object undo.token !      \ make it un-do-able
          "undo.new set.undoS
          current.object @ dup un.object !
          most.current !
          get.object
          redraw.object
            display.world.output
        then
      else
        do.error.alert                \ post alert if needed
      then
    then
    the.orth orthographic !
    the.alt alt.poly ! ;
```

6/1/90 20:06 SNAPSHOT.SOLID.8 Page 1

```
ANEW SNAPSHOT.SOLID

    360000  RESIZE.OBJECT
     80000  RESIZE.VOCAB

  FIND SMALL.DISPLAY 0 = IFTRUE   \ test for screen display
    -1 CONSTANT SMALL.DISPLAY
  IFEND


\ debugging


CREATE MY.DEBUG 0 ,

    \  use to test for compiler errors
  \ : INCLUDE"  .s room token.for INCLUDE" execute  ;

  INCLUDE" Res.Strings"
  INCLUDE" Overlay Utils"
  INCLUDE" Interface Utils"
  INCLUDE" PICT CONSTANTS"
  INCLUDE" NEW PRINTING"
  INCLUDE" DIALOG.UTILS"
  INCLUDE" Scale.Control"
  INCLUDE" FIXED.MEASURE"
  INCLUDE" SOLIDMODEL"
    INCLUDE" V.TOOLS"
  INCLUDE" EDGE"
  INCLUDE" PICT.UTILS"
  INCLUDE" SPHERE.UTILS4"
  INCLUDE" MATERIALS1"
  INCLUDE" LIGHT.PANEL"
  INCLUDE" DRAW.OBJECT.8"
  INCLUDE" TOOLBOX.DRAW"
  INCLUDE" CHECK.SUM"
    INCLUDE" NSHADOW2"
  INCLUDE" LINK.DRAW"
  INCLUDE" GRIDS"
    INCLUDE" DELTA.ATT"
  INCLUDE" KEY.HANDLE"
  INCLUDE" INTERFACE"
  INCLUDE" PALETTE.FILE"
  INCLUDE" SAVE.ENVIR"
  INCLUDE" FILE.UTILS"
  INCLUDE" ZOOM.RECTS"
  INCLUDE" O.TOOLS"
  INCLUDE" QUAD.UTILS.1"
  INCLUDE" QUAD.SIDE"
  INCLUDE" QUAD.CROSS"
  INCLUDE" HANDLE.CENTERS"
  INCLUDE" PATH.CHECK"
  INCLUDE" DOUBLE.ARROW.PANEL"  \ overlay
  INCLUDE" O.INTERFACE"
  INCLUDE" DRAWING.SCROLL"
  INCLUDE" HALF.PANEL"      \ overlay
  INCLUDE" Postscript.Image"    \ overlay
  INCLUDE" Postscript.Tree.8"   \ overlay
  INCLUDE" WORLD.PRINTING"
  INCLUDE" OBJECT.SCRAP"        \ uses forth filer proc
  INCLUDE" OBJECT.DRAWING.SCRAP"
  INCLUDE" INHERIT.PANEL"      \ overlay
  INCLUDE" FIND.PANEL"         overlay
  INCLUDE" OBJECT.INFO"        \ overlay
```

-000688

```
INCLUDE" OUTPUT.PANEL"      \ overlay
INCLUDE" EDIT.MENU"

SMALL.DISPLAY IFTRUE        \ test for screen display
  INCLUDE" ZBUFF.PANEL.SMALL"
IFEND

SMALL.DISPLAY NOT IFTRUE
  INCLUDE" ZBUFF.PANEL"
IFEND

INCLUDE" Swivel GDevice Palette"
INCLUDE" REFLECTANCE.8"
INCLUDE" VIEWER"
INCLUDE" PALETTE PANEL"
INCLUDE" ShadeEdit"
INCLUDE" ShadePanel"        \ overlay
INCLUDE" MATERIAL.EDIT.1"
INCLUDE" MATERIAL.PANEL"
INCLUDE" PALETTE.OPTIONS"       \ overlay
INCLUDE" PIXEL.TRANSFORM"
INCLUDE" Output.File.Utils"
INCLUDE" EPS FILES"         \ overlay
INCLUDE" WRITE.INFO.FILE"       \ overlay
INCLUDE" WRITE.PAINT"         \ overlay
INCLUDE" WRITE.PICT"        \ overlay
INCLUDE" WriteRenderMan1"       \ loads overlay
INCLUDE" Write.DXF.FILE"      \ loads overlay
INCLUDE" Effects.Render"
INCLUDE" Alias.Stuff"
INCLUDE" Write.32.Pict"       \ loads overlay
INCLUDE" Display2Screen"      \ loads overlay
INCLUDE" Display32Screen"       \ loads overlay
INCLUDE" WriteOutput.8"
INCLUDE" Tweening"
INCLUDE" Write Pics"
INCLUDE" WRITE ZSYS"
INCLUDE" DRAW.ARROWS"
INCLUDE" OBJECT.POSITION"
INCLUDE" OBJECT.ATTITUDE"
INCLUDE" ATT.PANEL"         \ overlay
  INCLUDE" RULER.PANEL"
INCLUDE" DESIGN.PREFS"
MAX.TYPE.POINTS 64 = IFTRUE
  INCLUDE" POLY SIDES.SMALL"
IFEND
MAX.TYPE.POINTS 100 = IFTRUE
  INCLUDE" POLY SIDES"
IFEND
MAX.TYPE.POINTS 100 =
MAX.TYPE.POINTS 64 = OR NOT IFTRUE
  ." Bad value for MAX.TYPE.POINTS" abort
IFEND
INCLUDE" ABOUT SWIVEL"
INCLUDE" OBJECT's VIEW"
INCLUDE" WORLD.MENU"
INCLUDE" SKIN.TREE"
INCLUDE" OBJECT.MENU.8"
INCLUDE" SHADE.MENU"
INCLUDE" EFFECTS.PANEL"
INCLUDE" OPTION.PANEL"
INCLUDE" TWEEN.PANEL"
INCLUDE" RENDER.MENU"
```

-000689

I

```
INCLUDE" WINDOW.RESET"
INCLUDE" TEXT.PARSE"
INCLUDE" FILE.MENU"
INCLUDE" BOOT.HANDLING.8"
INCLUDE" SWIVIpc"

PAGE ROOM
```

```
ANEW SNAPSHOT.SOLID

    360000  RESIZE.OBJECT
     80000  RESIZE.VOCAB

  FIND SMALL.DISPLAY 0 - IFTRUE        \ test for screen display
    -1 CONSTANT SMALL.DISPLAY
  IFEND

\ debugging


CREATE MY.DEBUG 0 ,

    \  use to test for compiler errors
  \ : INCLUDE"  .s room token.for INCLUDE" execute  ;

  INCLUDE" Res.Strings"
  INCLUDE" Overlay Utils"
  INCLUDE" Interface Utils"
  INCLUDE" PICT CONSTANTS"
  INCLUDE" NEW PRINTING"
  INCLUDE" DIALOG.UTILS"
  INCLUDE" Scale.Control"
  INCLUDE" FIXED.MEASURE"
  INCLUDE" SOLIDMODEL"
    INCLUDE" V.TOOLS"
  INCLUDE" EDGE"
  INCLUDE" PICT.UTILS"
  INCLUDE" SPHERE.UTILS4"
  INCLUDE" MATERIALS1"
  INCLUDE" LIGHT.PANEL"
  INCLUDE" DRAW.OBJECT.8"
  INCLUDE" TOOLBOX.DRAW"
  INCLUDE" CHECK.SUM"
    INCLUDE" NSHADOW2"
  INCLUDE" LINK.DRAW"
  INCLUDE" GRIDS"
    INCLUDE" DELTA.ATT"
  INCLUDE" KEY.HANDLE"
  INCLUDE" INTERFACE"
  INCLUDE" PALETTE.FILE"
  INCLUDE" SAVE.ENVIR"
  INCLUDE" FILE.UTILS"
  INCLUDE" ZOOM.RECTS"
  INCLUDE" O.TOOLS"
  INCLUDE" QUAD.UTILS.1"
  INCLUDE" QUAD.SIDE"
  INCLUDE" QUAD.CROSS"
  INCLUDE" HANDLE.CENTERS"
  INCLUDE" PATH.CHECK"
  INCLUDE" DOUBLE.ARROW.PANEL"  \ overlay
  INCLUDE" O.INTERFACE"
  INCLUDE" DRAWING.SCROLL"
  INCLUDE" HALF.PANEL"        \ overlay
  INCLUDE" Postscript.Image"     \ overlay
  INCLUDE" Postscript.Tree.8"     \ overlay
  INCLUDE" WORLD.PRINTING"
  INCLUDE" OBJECT.SCRAP"        \ uses forth filter proc
  INCLUDE" OBJECT.DRAWING.SCRAP"
  INCLUDE" INHERIT.PANEL"      \ overlay
  INCLUDE" FIND.PANEL"       \ overlay
  INCLUDE" OBJECT.INFO"       \ overlay
  INCLUDE" OUTPUT.PANEL"      \ overlay
```

-000691

6/1/90 20:06 SNAPSHOT.SOLID.I Page 2

```
INCLUDE" EDIT.MENU"

SMALL.DISPLAY IFTRUE        \ test for screen display
  INCLUDE" ZBUFF.PANEL.SMALL"
IFEND

SMALL.DISPLAY NOT IFTRUE
  INCLUDE" ZBUFF.PANEL"
IFEND

INCLUDE" Swivel GDevice Palette"
INCLUDE" REFLECTANCE.8"
INCLUDE" VIEWER"
INCLUDE" PALETTE PANEL"
INCLUDE" ShadeEdit"
INCLUDE" ShadePanel"        \ overlay
INCLUDE" MATERIAL.EDIT.I"
INCLUDE" MATERIAL.PANEL"
INCLUDE" PALETTE.OPTIONS"
INCLUDE" PIXEL.TRANSFORM"
INCLUDE" Output.File.Utils"
INCLUDE" EPS FILES"         \ overlay
INCLUDE" WRITE.INFO.FILE"       \ overlay
INCLUDE" WRITE.PAINT"         \ overlay
INCLUDE" WRITE.PICT"        \ overlay
INCLUDE" WRITE.ISAAC.FILE"      \ loads overlay
INCLUDE" WriteRenderMan"      \ loads overlay
INCLUDE" Write.DXF.FILE"      \ loads overlay
INCLUDE" Effects.Render"
INCLUDE" Alias.Stuff"
INCLUDE" Write.32.Pict"       \ loads overlay
INCLUDE" Display2Screen"      \ loads overlay
INCLUDE" WriteOutput.I"
INCLUDE" Tweening"
INCLUDE" Write Pics"
INCLUDE" WRITE ZSYS"
INCLUDE" DRAW.ARROWS"
INCLUDE" OBJECT.POSITION"
INCLUDE" OBJECT.ATTITUDE"
INCLUDE" ATT.PANEL"         \ overlay
INCLUDE" ISAAC.RENDER.FLAGS"      overlay
INCLUDE" RULER.PANEL"
INCLUDE" DESIGN.PREFS"
MAX.TYPE.POINTS 64 = IFTRUE
  INCLUDE" POLY SIDES.SMALL"
IFEND
MAX.TYPE.POINTS 100 = IFTRUE
  INCLUDE" POLY SIDES"
IFEND
MAX.TYPE.POINTS 100 =
MAX.TYPE.POINTS 64 = OR NOT IFTRUE
  ." Bad value for MAX.TYPE.POINTS" abort
IFEND
INCLUDE" ABOUT SWIVEL"
INCLUDE" OBJECT's VIEW"
INCLUDE" WORLD.MENU"
INCLUDE" SKIN.TREE"
INCLUDE" OBJECT.MENU.I"
INCLUDE" SHADE.MENU"
INCLUDE" EFFECTS.PANEL"
INCLUDE" OPTION.PANEL"
INCLUDE" TWEEN.PANEL"
INCLUDE" RENDER.MENU"
```

-000692

```
INCLUDE" WINDOW.RESET"
INCLUDE" TEXT.PARSE"
INCLUDE" FILE.MENU"
INCLUDE" BOOT.HANDLING.8"
INCLUDE" SWIVIpc"

PAGE ROOM
```

```
\ utilities for
\ cube bounding
\ set relative and absolute
\ get and put object
\ linking primatives

  ANEW --SOLIDMODEL--

  CR ." Loading Solidmodel Utils..."

   : POLY.CLIP
     POLY.YMIN @ + POLY.YMIN @ MAX POLY.YMAX @ MIN SWAP
     POLY.XMIN @ + POLY.XMIN @ MAX POLY.XMAX @ MIN SWAP 2SWAP
     POLY.YMIN @ + POLY.YMIN @ MAX POLY.YMAX @ MIN SWAP
     POLY.XMIN @ + POLY.XMIN @ MAX POLY.XMAX @ MIN SWAP 2SWAP ;

  CREATE GRID? 0 ,
  CREATE USE.HATCH  0 ,

  HEX

  : MOUSE4/
    @MOUSE  FFFCFFFC AND  ;

  DECIMAL

  : MOVE/UNCLICK
    @MOUSEXY BEGIN
    2DUP @MOUSEXY
    ROT = >R = R>
    AND  NOT
    MOUSE.BUTTON NOT
    OR UNTIL 2DROP ;

  : MOVE4/UNCLICK
    MOUSE4/ BEGIN
      DUP MOUSE4/ =  NOT
      MOUSE.BUTTON NOT
      OR UNTIL DROP ;

  : HOLDING  ( TICKS -- WAITS FOR NUMBER OF TICKS )
    >R TICKCOUNT
    BEGIN DUP TICKCOUNT SWAP -
    R@ > UNTIL DROP R>DROP ;

    5 CONSTANT WAIT.TIME

   VARIABLE HSC
   VARIABLE PROJECTX 0 PROJECTX !
   VARIABLE PROJECTY 0 PROJECTY !

( window.rect wrect, fetches current w.rectangle) ( 050366 ym )

   VARIABLE WINDOW.RECT
 : WRECT  GET.WINDOW 16 + WINDOW.RECT ! ;
```

```
( VGRID  DIV.VECTOR )                          ( 092686 YH )
 : VGRID  0 0 XYOFFSET
   GRID? @ IF
   SAVE.CLIP >R
   SET.TEMP.RECT
   TEMP.RECT  CLIP.RECT
   XOFFSET @ 10 - YOFFSET @   MOVE.TO
   XOFFSET @ 10 + YOFFSET @   DRAW.TO
   XOFFSET @  YOFFSET @ 10 -  MOVE.TO
   XOFFSET @  YOFFSET @ 10 +  DRAW.TO
   R> RESTORE.CLIP
   THEN ;


( SET.VIEW.LIMITS  SET.PROJECT )               ( 081686 YH )


: &SET.PROJECT
    DISTANCE @ CDISTANCE @
    DUP>R + * R> / SWAP
    DISTANCE @ EXT CDISTANCE @
    DUP>R + * R> / SWAP ;


 : SET.ZRECT     ( x y 'x 'y level ) >R
   POLY.CLIP R> (SET.ZRECT)  ;

 : 3>2POS
   NPROJECT
   FIX>INTEGER DROP
   YOFFSET @ + SWAP XOFFSET @ - SWAP  ;

 : 2>3POS
   YOFFSET @ - SWAP
   XOFFSET @ - SWAP 0
   INTEGER>FIX ;


  CREATE CURROL   0 ,
  CREATE CURYAW   0 ,
  CREATE CURPITCH 0 ,


 ( SET.DISTANCE, TOPOLOGY BEGINNINGS )          ( 092686 YH )

 CREATE DEPTH 0 ,


  :  NSHOW.DISTANCE
     05 290 MOVE.TO ." DEPTH:  " DISTANCE @ EXT . ;
```

-000695

```
 CODE  (GET.OBJECT.BOUNDS)               -- maxz minz maxy miny maxx minx
    SAVE.REGS
      ' ^ALLPOINTS A0 )&MOVE,
```

```
AO () AO LONG MOVE,            \ a0 is 'allpoints
a0 () AO LONG MOVE,            \ a0 is allpoints
A0 () D7 LONG MOVE,
4 AO I) DO LONG MOVE,
D0 D7 MULS,
D7 02 LONG SUBQ,             \ D7 IS COUNT
PL IF.L,
  8 AO I) DO LONG MOVE,          \ DO IS MAXZ
  8 A0 I) D1 LONG MOVE,         \ D1 IS MINZ
   12 AO I) D2 LONG MOVE,         \ D2 IS MAXY
   12 AO I) D3 LONG MOVE,         \ D3 IS MINY
   16 A0 I) D4 LONG MOVE,         \ D4 IS MAXX
   16 AO I) D5 LONG MOVE,         \ D5 IS MINX
     20 # AO LONG ADDA,
BEGIN,
  AO () DO LONG CMP, MI IF,
      A0 () DO LONG MOVE, THEN,    \ set maximum z
  A0 () D1 LONG CMP, PL IF,
      A0 () D1 LONG MOVE, THEN,    \ set minimum z
  4 AO I) D2 LONG CMP, MI IF,
      4 A0 I) D2 LONG MOVE, THEN,    \ set maximum y
  4 AO I) D3 LONG CMP, PL IF,
      4 A0 I) D3 LONG MOVE, THEN,    \ set minimum y
  8 A0 I) D4 LONG CMP, MI IF,
      8 A0 I) D4 LONG MOVE, THEN,    \ set maximum x
  8 A0 I) D5 LONG CMP, PL IF,
      8 AO I) D5 LONG MOVE, THEN,    \ set minimum x
  3POINT.LENGTH # AO LONG ADDA,
D7 LOOP,
FIX.SCALE D6 MOVEQ,
D0 D6 LONG ASR,
D1 D6 LONG ASR,
D2 D6 LONG ASR,
D3 D6 LONG ASR,
D4 D6 LONG ASR,
D5 D6 LONG ASR,              \ do fix>integer
D2 02 LONG ADDQ,
D3 02 LONG SUBQ,
D4 03 LONG ADDQ,
D5 03 LONG SUBQ,
DO PUSH,                  \ push z's
D1 PUSH,
YOFFSET AO )#MOVE,
AO () DO LONG MOVE,             \ add yoffset
DO D2 LONG ADD,
DO D3 LONG ADD,
D2 PUSH,                  \ push ys
D3 PUSH,
XOFFSET AO )#MOVE,             \ add xoffset
AO () DO LONG MOVE,
DO D4 LONG ADD,
DO D5 LONG ADD,
D4 PUSH,                  \ push xs
D5 PUSH,
ELSE,   0 LIT, 0 LIT,
    0 LIT, 0 LIT,
    0 LIT, 0 LIT,
THEN,
CUBE.BOUNDS A0 )#MOVE,
5 D3 MOVEQ,
    BEGIN,  SP )+  A0 )+ LONG MOVE,
  D3 LOOP,
RESTORE.REGS
NEXT END-CODE
```

-000696

```
\ rubber-band line

: STRETCH.LINE  ( xy| rubberband line startpoints, endpoints )
  SAVE.CLIP >R
  SET.TEMP.RECT
  TEMP.RECT CLIP.RECT
  10 PENMODE
  2DUP >R >R                ( temp return endpoints )
  BEGIN STILL.DOWN WHILE    ( main loop )
    2DUP @MOUSEXY           ( duplicate starting point )
     R>  R> 2DROP 2DUP      ( drop temp endpoints from rs)
    >R >R   2SWAP 4DUP      ( store new  temp endpoints )
    (MOVE.TO) (LINE.TO)     ( draw line )
     MOVE/UNCLICK           ( if no motion or unclick, wait)
      500 0 DO LOOP         ( wait anyway )
    (MOVE.TO) (LINE.TO)     ( erase line )
  REPEAT 2DROP R> R>
  R> RESTORE.CLIP  ;        ( return startpoints,endpoints )


\ rubberband rectangle

  0 0 0 0 RECT SELECT.RECT

 : STRETCH.RECT   ( xy ' rubberband rect, defines select.rect )
  SAVE.CLIP >R
  SET.TEMP.RECT
  TEMP.RECT CLIP.RECT
  10 PENMODE  2DUP >R >R    ( temp return endpoints         )
  BEGIN STILL.DOWN WHILE    ( main loop                     )
    2DUP @MOUSEXY           ( duplicate starting point      )
     R>  R> 2DROP 2DUP      ( drop temp endpoints from rs   )
    >R >R   2SWAP 4DUP      ( store new  temp endpoints     )
     FRAME RECTANGLE        ( draw rectangle                )
     MOVE/UNCLICK           ( if no motion or unclick, wait )
     500 0 DO LOOP          ( wait anyway  )
     FRAME RECTANGLE        ( erase rectangle )
  REPEAT R> R>              ( return startpoints,endpoints )
  ROT 2DUP MAX >R MIN >R    ( stack:  sx, ex, rstack >y <y )
  2DUP MAX >R MIN R> R> R> 2SWAP    ( <y >y <x > x        )
  ROT SWAP SELECT.RECT !RECT
   R> RESTORE.CLIP   ;      ( <y <x >y >x rect ! )


\ object selection


 VARIABLE OFLAG

 -1 constant HIT.OFF.Y
  0 constant HIT.OFF.X

: SELECT.OBJECT?                 ( X Y   SETS CURRENT OBJECT, FLAG )
    0 LOCALS| HIT.OBJECT SELECT.Y SELECT.X
    SELECT.X V.TOOL.WIDTH -
    HIT.OFF.X +
    1 MAX ZBUFFERX @ 1- MIN TO SELECT.X     \ clip to zbuffer bounds
    SELECT.Y HIT.OFF.Y +
    1 MAX ZBUFFERY @ 1- MIN TO SELECT.Y       \ clip to zbuffer bounds
    SELECT.X SELECT.Y OBUFF@ TO HIT.OBJECT
```

-000697

```
    HIT.OBJECT 0= IF
    SELECT.X SELECT.Y 1+
    OBUFF@ TO HIT.OBJECT
    HIT.OBJECT 0= IF
    SELECT.X 1+ SELECT.Y
    OBUFF@ TO HIT.OBJECT
      HIT.OBJECT 0= IF
      SELECT.X 1- SELECT.Y
      OBUFF@ TO HIT.OBJECT
        HIT.OBJECT 0= IF
          SELECT.X SELECT.Y 1-
          OBUFF@ TO HIT.OBJECT
        THEN
      THEN
    THEN
  THEN
   HIT.OBJECT
   Z.MASK AND                   \ fix 03/14/88  for negative object hits
   WORLD.OBJECT + DUP              \ fetch selected object , add world offset from obuffer
   SET.CURRENT.OBJECT                  \ set current
   WORLD.OBJECT = IF 0
   ELSE -1 THEN    ;               \ return flag


   : RECT.INTERSECT?  ( CURRENT.RECT TEST.RECT - BOOLEAN )
    0 OFLAG !
      ( CXMIN CYMIN CXMAX CYMAX TXMIN TYMIN TXMAX TYMAX )
   6 pick  5 pick   <                      ( cxmax < txmin )
   3 pick  10 pick  < or not IF            ( txmax < cxmin )
      5 pick  4 pick     <                 ( cymax < tymin )
      2 PICK  9 pick    < or not IF        ( tymax < cymin )
             -1 OFLAG ! THEN THEN
   2drop 2drop 2drop 2drop  OFLAG @ ;

 VARIABLE TEMPO.RECT  8 ALLOT


    :  DISPLAY.OBJECT
     SAVE.CLIP >R
     8 PENMODE
     SET.TEMP.RECT
     TEMP.RECT CLIP.RECT
     BACK.BITS
     GET.WINDOW 2 +
       OBJECT.RECT PLUCK
     POLY.CLIP            \ clip before copybits call for clipping bug
     SWAP 2SWAP SWAP 2SWAP
     TEMPO.RECT !RECT
     V.TOOL.WIDTH  0
     TEMPO.RECT
     MAKE.OFFSET.RECT
     TEMPO.RECT SWAP 0 0
     COPY.BITS
     R> RESTORE.CLIP
     V.TOOL.WIDTH -1        \ display the bounds of the current backport
     ZBUFFERX @ V.TOOL.WIDTH - 1-
       ZBUFFERY @
     FRAME RECTANGLE   ;
```

-000698

```
    : OFFSET.RECT           ( offsets rectangle to world coords )
      YOFFSET @ + >R
      XOFFSET @ + >R
```

T

```
    YOFFSET @ + >R
    XOFFSET @ + R> R> R>  ;


  \ variables and constants for attitude routines


   VARIABLE TEST.VEC 36 ALLOT


   CREATE ORTHO.VEC
      0 ,     0 , COS.SCALER 4/ ,
      0 , COS.SCALER 4/ ,     0 ,
  COS.SCALER 4/ ,     0 ,     0 ,



( NSWIVEL, )                                    ( 112486 YH )

  CODE N.SWIVEL,                 ( X Y Z -- 'X 'Y 'Z )
  >R,
  (SWIVEL),
  R>,
  RTS, END-CODE


( UN.SWIVEL )                                   ( 112486 YH )

 CODE UN.SWIVEL
   SAVE.REGS
   (UN.SWIVEL),
   RESTORE.REGS
 NEXT END-CODE


 CODE UN.SWIVEL,
 >R, (UN.SWIVEL),
  R>, RTS, END-CODE


  CODE CROSS.PRODUCT,  \ QX QY QZ PX PY PZ -- CX CY CZ
  >R,
   02 SP@, D0 LONG MOVE,
       14 SP I) D0 MULS,        \ D0 - PyQz
   SP ()    D1 LONG MOVE,
       18 SP I) D1 MULS,        \ D1 - PyQz
     D1  D0 LONG SUB,          \ D0 = PyQz - PyQz
   SP ()    D1 LONG MOVE,
       22 SP I) D1 MULS,        \ D1 = PzQx
   03 SP@, D2 LONG MOVE,
       14 SP I) D2 MULS,        \ D2   PxQz
     D2  D1 LONG SUB,          \ D1   PzQx - PxQz
   03 SP@, D2 LONG MOVE,
       18 SP I) D2 MULS,          D2 -   PxQy
   02 SP@, D3 LONG MOVE,
       22 SP I) D3 MULS,        \ D3 =   PyQx
      D3  D2 LONG SUB,         \ D2 =  PxQy - PyQx
        SP 08 LONG ADDQ,
        SP 08 LONG ADDQ,
        SP 08 LONG ADDQ,          empty the stack
  D0 SWAP, D0 LONG EXT,
```

-000699-

```
 D1 SWAP, D1 LONG EXT,
 D2 SWAP, D2 LONG EXT,
 D0 PUSH,
 D1 PUSH,
 D2 PUSH,       \ push results
 R>,
 RTS, END-CODE


: .TEST.VEC
   36 0 DO TEST.VEC I + @ . CR 4 +LOOP ;


( SET.TEST.VEC )                            ( 112486 YH )


CODE SET.TEST.VEC, >R,  TEST.VEC A0 )#MOVE,
  ORTHO.VEC TEST.VEC -       A0 I)       A0 () LONG MOVE,
  ORTHO.VEC TEST.VEC -  4 - A0 I)    4  A0 I) LONG MOVE,
  ORTHO.VEC TEST.VEC -  8 - A0 I)    8  A0 I) LONG MOVE,
  ORTHO.VEC TEST.VEC - 12 + A0 I)   12  A0 I) LONG MOVE,
  ORTHO.VEC TEST.VEC - 16 + A0 I)   16  A0 I) LONG MOVE,
  ORTHO.VEC TEST.VEC - 20 - A0 I)   20  A0 I) LONG MOVE,
  ORTHO.VEC TEST.VEC - 24 - A0 I)   24  A0 I) LONG MOVE,
  ORTHO.VEC TEST.VEC - 28 + A0 I)   28  A0 I) LONG MOVE,
  ORTHO.VEC TEST.VEC - 32 + A0 I)   32  A0 I) LONG MOVE,
  R>,  RTS,   END-CODE


 CODE  SET.TEST.VEC  ' SET.TEST.VEC, 4- BSR, NEXT END-CODE


: POPI), ASSEMBLER  SP )-  2SWAP LONG MOVE,  ;


 CODE TEST.SWIVEL,  >R,
 TEST.VEC A2 )#MOVE,
   8 A2 I) PUSH,
 4 A2 I) PUSH,
 A2 ()   PUSH,
 ' N.SWIVEL, 4- BSR,
   A2 () POP,
 4 A2 I)  POPI),
 8 A2 I)  POPI),
   20 A2 I) PUSH,
 16 A2 I) PUSH,
 12 A2 I) PUSH,
 ' N.SWIVEL, 4- BSR,
   12 A2 I) POPI),
 16 A2 I) POPI),
 20 A2 I) POPI),
   32 A2 I) PUSH,
 28 A2 I) PUSH,
 24 A2 I) PUSH,
 ' N.SWIVEL, 4- BSR,
   24 A2 I) POPI),
 28 A2 I) POPI),
 32 A2 I) POPI),
 R>, RTS, END-CODE
```

```
CODE TEST.SWIVEL
     SAVE.REGS
   ' TEST.SWIVEL, 4- BSR,
     RESTORE.REGS
     NEXT END-CODE


CODE TEST.UN.SWIVEL,  >R,
 TEST.VEC A2 )#MOVE,
   8 A2 I) PUSH,
 4 A2 I) PUSH,
 A2 () PUSH,
 ' UN.SWIVEL, 4- BSR,
   A2 () POP,
 4 A2 I) POPI),
 8 A2 I) POPI),
 20 A2 I) PUSH,
 16 A2 I) PUSH,
 12 A2 I) PUSH,
 ' UN.SWIVEL, 4- BSR,
   12 A2 I) POPI),
 16 A2 I) POPI),
 20 A2 I) POPI),
   32 A2 I) PUSH,
 28 A2 I) PUSH,
 24 A2 I) PUSH,
' UN.SWIVEL, 4- BSR,
   24 A2 I) POPI),
 28 A2 I) POPI),
 32 A2 I) POPI),
 R>, RTS,  END-CODE


CODE TEST.UN.SWIVEL
     SAVE.REGS
   ' TEST.UN.SWIVEL, 4- BSR,
     RESTORE.REGS
     NEXT END-CODE

( sqrt, )                                    ( 112486 YH )


( NORMAL2 )                                  ( 112486 YH )

CODE NORMAL2,     ( normalize 2vector to COS.SCALER )
   >R, D0 GET,
 2 SP@, D1 LONG MOVE,
 D0 D0 MULS,
 D1 D1 MULS,
 D1  D0 LONG ADD,
 D0 PUSH,  SQRT,  D3 POP,
 D1 POP, D2 POP,
 D3 D1 FIX.DIV,      \ because cos is scaled to 10000 hex
 D3 D2 FIX.DIV,
 D2 PUSH, D1 PUSH,
 R>, RTS,
 END-CODE

 CODE NORMAL2  SAVE.REGS ' NORMAL2, 4- BSR, RESTORE.REGS NEXT END-CODE
```

```
: CHECK.NIL, assembler
  SP ()   LONG TST, EQ IF,
  2 SP@,  LONG TST, EQ IF,
  2DROP,  0 LIT, COS.SCALER LIT,
  THEN, THEN, ;

CODE CHECK.NIL  CHECK.NIL, NEXT END-CODE



: YAW.ATTITUDE  ASSEMBLER
  TEST.VEC A0 )#MOVE,
 24 A0 I) PUSH,
 32 A0 I) PUSH,
  ' NORMAL2,  4- BSR,
   CHECK.NIL,
 D1 POP, D0 POP,   ( check for 0, 0      )
   YAW.COS A0 )#MOVE,
 D0 A0 () COS.ASIZE MOVE,
   D1 YAW.SIN YAW.COS -  A0 I) COS.ASIZE MOVE,
   COS.SCALER #  PITCH.COS  YAW.COS -  A0 I) COS.ASIZE MOVE,
        0 #    PITCH.SIN  YAW.COS -  A0 I) COS.ASIZE MOVE,
   COS.SCALER #  ROLL.COS   YAW.COS -  A0 I) COS.ASIZE MOVE,
        0 #    ROLL.SIN   YAW.COS -  A0 I) COS.ASIZE MOVE,
   D1 LONG NEG,
   TYAW.COS A0 )#MOVE,
 D0 A0 () COS.ASIZE MOVE,
   D1 TYAW.SIN TYAW.COS - A0 I) COS.ASIZE MOVE,
   ' TEST.SWIVEL, 4- BSR, ;



: PITCH.ATTITUDE  ASSEMBLER
  TEST.VEC A0 )#MOVE,
 24 A0 I) PUSH,
 28 A0 I) PUSH,
  ' NORMAL2, 4- BSR,
  CHECK.NIL,
      D1 POP, D0 POP,   ( check for 0, 0   )
      PITCH.COS A0 )#MOVE,
   D0 A0 () COS.ASIZE MOVE,
      D1 PITCH.SIN  PITCH.COS -    A0 I) COS.ASIZE MOVE,
   COS.SCALER #    YAW.COS    PITCH.COS -   A0 I) COS.ASIZE MOVE,
     0 #     YAW.SIN    PITCH.COS -   A0 I) COS.ASIZE MOVE,
   COS.SCALER #    ROLL.COS   PITCH.COS -   A0 I) COS.ASIZE MOVE,
     0 #     ROLL.SIN   PITCH.COS -   A0 I) COS.ASIZE MOVE,
  D1 LONG NEG,
     TPITCH.COS A0 )#MOVE, D0 A0 () COS.ASIZE MOVE,
  D1 TPITCH.SIN TPITCH.COS - A0 I)  COS.ASIZE MOVE,
  ' TEST.SWIVEL, 4- BSR, ;


: ROL.ATTITUDE  ASSEMBLER
  TEST.VEC A0 )#MOVE,
 8 A0 I) PUSH,
 4 A0 I) PUSH,
 ' NORMAL2, 4- BSR,
```

-000702

T

```
    CHECK.NIL,
  D1 POP, D0 POP,       ( check for 0, 0  )
    TROLL.COS A0 )#MOVE,
  D0  A0 () COS.ASIZE MOVE,
    D1 TROLL.SIN TROLL.COS -  A0 () COS.ASIZE MOVE,  ;


  CODE GET.ATTITUDE
    SAVE.REGS
    YAW.ATTITUDE
    PITCH.ATTITUDE
    ROL.ATTITUDE
    RESTORE.REGS
    NEXT END-CODE

  CODE GET.ATTITUDE,  >R,
    YAW.ATTITUDE
    PITCH.ATTITUDE
    ROL.ATTITUDE
  R>, RTS, END-CODE


    VARIABLE THIS.OBJECT


( SET.ABSOLUTE.POSITION )                              ( 070486 YH )
 CODE SET.ABSOLUTE.POSITION,           ( current.object preset    )
   >R,  CURRENT.OBJECT A0 )#MOVE,
    A0 () RP -) LONG MOVE,             ( save current object       )
     ' OBJECT.R3POS (PLUCK),           ( relative pos to stack     )
 ' UP.TREE O@, (SET.CURRENT.OBJECT),   ( move up coord systems     )
 ' OBJECT.SCALE O@,  SCALE.VECTOR,     ( scale r.pos by a.scale    )
    (OBJECT.ACOS>COSINES)              ( get absolute cosines      )
  ' N.SWIVEL, 4- BSR,                ( swivel r.pos by global  )
 ' OBJECT.A3POS (PLUCK),               ( get absolute 3pos         )
    ADD.3POS,                          ( add to r.pos, now a.pos   )
   R>,  (SET.CURRENT.OBJECT),          ( move down coord systems   )
  ' OBJECT.A3POS (PLACE),              ( store new absolute pos    )
  R>,  RTS, END-CODE


( SET.ABSOLUTE.ATTITUDE )                              ( 081686 YH )
CODE SET.ABSOLUTE.ATTITUDE,            ( current.object pre-set )
   >R, CURRENT.OBJECT A0 )#MOVE,
   A0 () PUSH,  >R,                    ( save current object      )
   (OBJECT.RCOS>COSINES)               ( fetch relative cosine    )
   ' SET.TEST.VEC, 4- BSR,             ( clear test vector        )
   ' TEST.SWIVEL, 4- BSR,              ( swivel relative          )
   ' UP.TREE O@,
   (SET.CURRENT.OBJECT),               ( up one level             )
   (OBJECT.ACOS>COSINES)               ( fetch absolute cosines )
   R>, (SET.CURRENT.OBJECT),           ( down to original level )
   ' TEST.SWIVEL,  4- BSR,             ( swivel ^absolute         )
   ' GET.ATTITUDE, 4- BSR,             ( calc attitude, get cos )
   (TVARS>OBJECT.ACOS)
   R>, RTS, end-code                   ( store in absolute cos    )


( SET.ABSOLUTE.SCALE, )                                ( 070486 YH )
 CODE SET.ABSOLUTE.SCALE,              ( current object pre-set   )
   >R,  CURRENT.OBJECT A0 )#MOVE,
```

-000703

```
   A0 () PUSH,  >R,               ( save current object      )
   ' OBJECT.RSCALE O@,
   ' UP.TREE O@,
  (SET.CURRENT.OBJECT),           ( move up to next object   )
   ' OBJECT.SCALE O@,             ( scale by absolute scale  )
   D2 POP, D1 POP,
  D2 D1 FIX.SCALE,          ( r.scale * ^a.scale / SCALE.RANGE  )
   D1 PUSH,
  R>, (SET.CURRENT.OBJECT),       ( restore current.object   )
 SP () SCALE.MAX LONG CMPI,
 PL IF,
   DROP,
   SCALE.MAX LIT,
 THEN,
 SP () SCALE.MIN LONG CMPI,
 MI IF,
   DROP,
   SCALE.MIN LIT,        \ clip.to.scale bounds
 THEN,
 ' OBJECT.SCALE  (PLACE),        \ store absolute scale
  R>, RTS, END-CODE

( SET.ABSOLUTE )

 : (SET.ABSOLUTE)  ASSEMBLER   ( current object pre-set )
     (COS>SAVE)
     ' SET.ABSOLUTE.POSITION,  4- BSR,
     ' SET.ABSOLUTE.SCALE,     4- BSR,
     ' SET.ABSOLUTE.ATTITUDE,  4- BSR,
     (SAVE>COS)  ;

  CODE SET.ABSOLUTE, >R, (SET.ABSOLUTE) R>, RTS, END-CODE

  CODE SET.ABSOLUTE
       SAVE.REGS
       (SET.ABSOLUTE)
.   RESTORE.REGS
       NEXT END-CODE



( SET.RELATIVE.POSITION)                          ( 081686 YH )
  CODE SET.RELATIVE.POSITION,      ( current object preset )
   >R, CURRENT.OBJECT A0 )#MOVE,
   A0 () RP -) LONG MOVE,
  ' OBJECT.A3POS (PLUCK),          ( fetch absolute pos )
  ' UP.TREE O@,
   (SET.CURRENT.OBJECT),           ( next coord. system up )
   ' OBJECT.A3POS (PLUCK),         ( fetch up tree a.pos )
   SUB.3POS,                       ( curr apos - up tree a.pos )
   (OBJECT.ACOS>COSINES)
   ' UN.SWIVEL, 4- BSR,
   ' OBJECT.SCALE O@,
   UN.SCALE.VECTOR,                ( unscale a.pos        )
   R>, (SET.CURRENT.OBJECT),       ( restore current object)
   ' OBJECT.R3POS (PLACE),         ( store relative pos    )
  R>, RTS, END-CODE
( SET.RELATIVE.ATTITUDE )                         ( 072586 YH )

   CODE SET.RELATIVE.ATTITUDE,
    >R, CURRENT.OBJECT A0 )#MOVE,
    A0 () RP -) LONG MOVE,            ( save object          )
    (OBJECT.ACOS>COSINES)             ( put in global cosines )
    ' SET.TEST.VEC, 4- BSR,           ( set test vector 0 0 0 )
```

-000704

```
   ' TEST.SWIVEL, 4- BSR,                ( swivel test vector      )
  ' UP.TREE O@, (SET.CURRENT.OBJECT),    ( move up tree            )
   (OBJECT.ACOS>COSINES)                 ( put in global cosines   )
   R>, (SET.CURRENT.OBJECT),             ( restore current object  )
   ' TEST.UN.SWIVEL, 4- BSR,             ( un.swivel               )
   ' GET.ATTITUDE,   4- BSR,             ( get attitude of test    )
   (TVARS>OBJECT.RCOS)                   ( store in relative cos   )
   R>, RTS, END-CODE

( SET.RELATIVE.SCALE,  )                             ( 070486 YH )
 CODE SET.RELATIVE.SCALE,             ( current object pre-set  )
  >R, CURRENT.OBJECT A0 )#MOVE,
  A0 () PUSH,  >R,                    ( save current object     )
  ' OBJECT.SCALE O@,
  ' UP.TREE O@,
  (SET.CURRENT.OBJECT),               ( move up to next object  )
  ' OBJECT.SCALE O@,                  ( scale by absolute scale )
 D1 POP, D2 POP,
 D1 D2 FIX.UNSCALE,      \ unscale a.scale by ^a.scale
 D2 PUSH,
 R>, (SET.CURRENT.OBJECT),            ( restore current.object  )
  ' OBJECT.RSCALE  (PLACE),           ( store absolute scale    )
 R>,  RTS, END-CODE


\  SET.RELATIVE,

  : (SET.RELATIVE)  ASSEMBLER              ( current object preset )
   (COS>SAVE)
   ' SET.RELATIVE.ATTITUDE, 4- BSR,
   ' SET.RELATIVE.SCALE,    4- BSR,
   ' SET.RELATIVE.POSITION, 4- BSR,
   (SAVE>COS) ;


 CODE SET.RELATIVE
      SAVE.REGS
      (SET.RELATIVE)
      RESTORE.REGS
      NEXT END-CODE

 CODE SET.RELATIVE,
      >R, (SET.RELATIVE) R>,
      RTS, END-CODE



( MODIFY.MOUSE, RETURNS MODIFY KEY STATE )         ( 112785 YH )

  0  CONSTANT JUST.BUTTON      2 CONSTANT COMMAND.BUTTON
  4  CONSTANT SHIFT.BUTTON     8 CONSTANT LOCK.BUTTON
 16  CONSTANT OPTION.BUTTON
  1  CONSTANT NO.BUTTON
  CODE  MODIFY
      A0 POP,  14 A0 I) D0 WORD MOVE,
      D0 07 # WORD ROR, D0 31 WORD ANDI,
      D0 PUSH, NEXT END-CODE

 : MODIFY.MOUSE
   EVENT.RECORD MODIFY dup 1 AND not  IF
   >R  EVENT.RECORD 10 + @ GLOBAL>LOCAL POINT>XY
```

-000705

```
  R> THEN ;

( ONLY.OBJECT.SELECTED )                        ( 120386 YH )
 : ONLY.OBJECT.SELECTED
   CURRENT.OBJECT @  WORLD.OBJECT SET.CURRENT.OBJECT
   BEGIN  CURRENT.OBJECT @ 1 + SET.CURRENT.OBJECT
   CURRENT.OBJECT @ LAST.OBJECT =
   OBJECT.STATE PLUCK THE.END = OR NOT WHILE
   OBJECT.STATE PLUCK UNUSED > IF
     ACTIVE OBJECT.STATE PLACE THEN
     REPEAT
   SET.CURRENT.OBJECT
   OBJECT.STATE PLUCK UNUSED > IF
   SELECTED OBJECT.STATE PLACE ELSE
   WORLD.OBJECT SET.CURRENT.OBJECT THEN ;

  : SELECT.AND.MOVE?
    SELECT.OBJECT?
    ONLY.OBJECT.SELECTED
    IF MOVE4/UNCLICK MOUSE.BUTTON
    ELSE 0 THEN ;
( NULL.OP, _, FIND.LOW.LEVEL )                  ( 062886 YH )


( NOT.RECURSIVE )

 VARIABLE RECURSOR
 VARIABLE RECURSEE
 VARIABLE LINK.TEMP
 VARIABLE GLOBAL.LINK
 POSITION.LOCK GLOBAL.LINK W!

 : NOT.RECURSOR  RECURSOR !
  CURRENT.OBJECT @ RECURSEE !
  BEGIN
    CURRENT.OBJECT @ DUP RECURSOR @ -
    SWAP WORLD.OBJECT = OR NOT WHILE
    UP.TREE PLUCK SET.CURRENT.OBJECT
  REPEAT
  CURRENT.OBJECT @ WORLD.OBJECT = IF
  -1 ELSE 0 THEN
  RECURSEE @  SET.CURRENT.OBJECT  ;


( OBJECT.LINK )



( SELECT.W/RECT )                               ( 081786 YH )

 :  SELECT.W/RECT
    CURRENT.OBJECT @
    STRETCH.RECT
      WORLD.OBJECT SET.CURRENT.OBJECT
      BEGIN
      CURRENT.OBJECT @ 1- SET.CURRENT.OBJECT
      OBJECT.STATE PLUCK UNUSED >  IF
      OBJECT.A2POS PLUCK
      XY>POINT SELECT.RECT PTINRECT IF
         SELECTED OBJECT.STATE PLACE THEN
     THEN
     OBJECT.STATE PLUCK
   THE.END =
     CURRENT.OBJECT @
```

-000706

```
     LAST.OBJECT =  OR
     UNTIL
     SET.CURRENT.OBJECT ;

( CURSOR.RCOS, CURSOR.R3POS, CURSOR.RSCALE )      ( 120186 YH )

 CREATE CURSOR.RCOS
    COS.SCALER COS, 0 COS, COS.SCALER COS, 0 COS, COS.SCALER COS, 0 COS,

 CREATE CURSOR.ACOS
    COS.SCALER COS, 0 COS, COS.SCALER COS, 0 COS, COS.SCALER COS, 0 COS,

 CREATE CURSOR.^ACOS
    COS.SCALER COS, 0 COS, COS.SCALER COS, 0 COS, COS.SCALER COS, 0 COS,

 CREATE CURSOR.R3POS  0 , 0 , 0 ,

 CREATE CURSOR.A3POS  0 , 0 , 0 ,

 CREATE CURSOR.^A3POS 0 , 0 , 0 ,

 CREATE CURSOR.RSCALE SCALE.RANGE  ,

 CREATE CURSOR.^SCALE SCALE.RANGE   ,

 CREATE CURSOR.SCALE  SCALE.RANGE   ,


  : GET.^VARS  CURRENT.OBJECT @ >R
    UP.TREE PLUCK  SET.CURRENT.OBJECT
    OBJECT.ACOS   CURSOR.^ACOS SWAP  MOVE.RECORD
    OBJECT.SCALE PLUCK CURSOR.^SCALE !
    OBJECT.A3POS  CURSOR.^A3POS SWAP MOVE.RECORD
    R> SET.CURRENT.OBJECT  ;

 ( GET.OBJECT )                                  ( 120186 YH )

     VARIABLE THIS.TOP   WORLD.OBJECT THIS.TOP !


    : GET.OBJECT
    OBJECT.A3POS CURSOR.A3POS SWAP MOVE.RECORD
      OBJECT.A3POS PLUCK
      DISTANCE ! OBJECTY ! OBJECTX !
      OBJECT.R3POS CURSOR.R3POS  SWAP MOVE.RECORD
      OBJECT.ACOS  COSINES     SWAP MOVE.RECORD
      OBJECT.RCOS  CURSOR.RCOS   SWAP MOVE.RECORD
      OBJECT.ACOS  CURSOR.ACOS   SWAP MOVE.RECORD
      GET.^VARS
      OBJECT.SCALE  PLUCK  DUP SC ! CURSOR.SCALE !
      OBJECT.RSCALE PLUCK CURSOR.RSCALE !
      OBJECT.REFLECT PLUCK REFLECTO !
    OBJECT.PALETTE.INDEX PLUCK COLOR.INDEX !
      LINK.TYPE PLUCK CURRENT.LINK !
    CURRENT.OBJECT @ WORLD.OBJECT -
    OBJECT.ID !
    OBJECT.MEASURE.TO.SCREEN PLUCK      \ fetch object grid and measure to global s
    FIX.SCREEN.TO.MEASURE !
    OBJECT.MEASURE.DIV  PLUCK
    FIX.MEASURE.DIV !
    OBJECT.FORM.RENDER PLUCK
    DUP CULL.BACK.BIT AND CULL.BACK? !
    DUP TRIANGLE.MESH.BIT AND TRIANGLE.MESH? !
```

-000707

```
    DUP FRONT.CAP.BIT AND FRONT.CAP? :
    BACK.CAP.BIT AND  BACK.CAP? :
    OBJECT.R3CENTER O.CENTER SWAP MOVE.RECORD
    OBJECT.FORM PLUCK
    CASE
      PATH.FORM OF GET.CONTOURS ENDOF
    MESH.FORM OF GET.MESH ENDOF
    ENDCASE  ;


( PUT.OBJECT )                                    ( 081486 YH )
 : PUT.OBJECT
   ACTIVE              OBJECT.STATE    PLACE
   REFLECTO @          OBJECT.REFLECT  PLACE
   SC @                OBJECT.SCALE    PLACE
   CURSOR.RSCALE  @    OBJECT.RSCALE   PLACE
   CURSOR.R3POS      OBJECT.R3POS    MOVE.RECORD
   OBJECTX @ OBJECTY @ DISTANCE 3
   3DUP OBJECT.A3POS  PLACE
   3>2POS    OBJECT.A2POS        PLACE
   CURSOR.RCOS    OBJECT.RCOS  MOVE.RECORD
   COSINES        OBJECT.ACOS  MOVE.RECORD
   CUBE.BOUNDS    OBJECT.RCUBE MOVE.RECORD
   O.CENTER OBJECT.R3CENTER    MOVE.RECORD
   OBJECT.FORM PLUCK PATH.FORM = IF
    PUT.CONTOURS
   THEN
   OBJECT.CHANGED ;


( tests for intersections on the tree )           ( 081286 YH )

 VARIABLE TEST.RECT 8 ALLOT
 VARIABLE I.FLAG


  HEX

  A8AB  MT  UNION.RECT
  A8AA  CONSTANT  _SECT.RECT


DECIMAL

  CODE SECT.RECT
     D0 POP,
     D1 POP,
     D2 POP,
     0 LIT,
       D2 PUSH,
     D1 PUSH,
     D0 PUSH,
     _SECT.RECT W,
  NEXT END-CODE


CODE RECT.MOVE           \ src.4th.rect dest.mac.rect --
   A0 POP, A1 POP,
   A1 )+ D0 LONG MOVE,
   D0 SWAP,
   D0 A0 )+ LONG MOVE,
   A1 )+ D0 LONG MOVE,
   D0 SWAP,
   D0 A0 )- LONG MOVE, NEXT END-CODE
```

-000708

```
CREATE NULL.RECT    0 , 0 ,
CREATE SCRATCH.RECT   0 , 0 ,
CREATE BOUNDS.RECT  0 , 0 ,
CREATE FIRST.ONE -1 ,

: UNION.OBJECT.RECT
  OBJECT.STATE PLUCK UNUSED >
  CURRENT.OBJECT @ WORLD.OBJECT - NOT AND
  OBJECT.FORM PLUCK PICT.FORM < AND IF
    FIRST.ONE @ IF
      OBJECT.RECT PLUCK SCRATCH.RECT !RECT
      SCRATCH.RECT BOUNDS.RECT 8 CMOVE
      0 FIRST.ONE !
    ELSE
      OBJECT.RECT PLUCK SCRATCH.RECT !RECT
      SCRATCH.RECT BOUNDS.RECT
      DUP UNION.RECT
    THEN
  THEN ;

FIND UNION.OBJECT.RECT CONSTANT ^UNION.OBJECT.RECT

  : SET.TREE.BOUNDS
  -1 FIRST.ONE !
  OPERATION @ >R
  ^UNION.OBJECT.RECT OPERATION !
  TRAVERSE.DOWN.TREE
  R> OPERATION !  ;

: BOUNDS.TEST
  SET.TREE.BOUNDS BOUNDS.RECT @RECT FRAME RECTANGLE ;



  : INTERSECT.OBJECT?
  TEST.RECT  8 WPLUCK
  OBJECT.RECT  PLUCK
    RECT.INTERSECT?
  IF -1 I.FLAG !
  THEN ;

 FIND INTERSECT.OBJECT?  CONSTANT  ^INTERSECT.OBJECT?

:  INTER.TREE  ( RECTANGLE  FLAG )
    OPERATION @   0 I.FLAG !
   ^INTERSECT.OBJECT?  OPERATION ! TRAVERSE.DOWN.TREE
   OPERATION ! I.FLAG @ ;

( PRINT.OBJECT, PRINT.GROUP )                    ( 081586 YH )
 : O.  SET.CURRENT.OBJECT CR
 ."  OBJECT#    "  current.object @ .
 ."  STATE:     "  object.state PLUCK .
 ."  UP.TREE    "  UP.TREE PLUCK .
 ."  DOWN.TREE  "  DOWN.TREE PLUCK . cr
 ."  RIGHT.TREE "  RIGHT.TREE PLUCK .
 ."  LEFT.TREE  "  LEFT.TREE PLUCK .
 ."  LEVEL      "  OBJECT.LEVEL PLUCK .
  CR
```

-000709

```
." APOS :   " OBJECT.A3POS PLUCK . . .   CR
." ASCALE : " OBJECT.SCALE PLUCK . CR
OBJECT.RCOS PLUCK . . . . . . ."     "
OBJECT.ACOS PLUCK . . . . . .     CR    ;

: CO. CURRENT.OBJECT @ C. ;


( PRINT.OBJECT, PRINT.GROUP )                    ( 081586 YH )
: T.  SET.CURRENT.OBJECT CR
."  OBJECT#     "  current.object @ .
."  STATE:      "  object.state PLUCK .
."  UP.TREE     "  UP.TREE PLUCK .
."  DOWN.TREE   "  DOWN.TREE PLUCK . cr
."  RIGHT.TREE  "  RIGHT.TREE PLUCK .
."  LEFT.TREE   "  LEFT.TREE PLUCK .
."  LEVEL       "  OBJECT.LEVEL PLUCK . ;

: TEST.OBJECT
CURRENT.HANDLE @ 0 = IF
  ABORT THEN
RES.STATE PLUCK 1 < IF
  ABORT THEN
CURRENT.OBJECT @ T. ;


( WRITE.OBJECT,  CREATES NEW RECORD, DRAWS OBJECT   120785 YH )
```

6/1/90 20:07 SPHERE.UTILS4 Page 1

```
CR ." LOADING LIGHT.VECTOR UTILS"

ANEW -sphere.mapping-

\ writes a znormal map for fast sphere generation
\ 10-2-89 Young Harvill

." loading sphere shading utils... "


CREATE LIGHT.LOCK 0 ,
CREATE C.START.COS COS.LENGTH ALLOT
CREATE START.VECTOR 12 ALLOT


8 CONSTANT lights#

Structure Light.Record
  Long: +LightUnused
  Long: +DirectScale
  Long: +LightType
 3 Longs: +LightVector
 3 Longs: +RelLightVector
 3 Shorts: +LightRGB
 Structure.end

Create LightHand 0 ,
Create Lights Light.Record lights# * allot       \ light array
Create Current.Light 0 ,               \ index into light array
Create TempLights Light.Record lights# * allot     \ temp.light array


: SetCurrentLight
  lights# 1 -  min Light.Record *
  Current.Light ! ;

: Light.Vector
  Lights
  Current.Light @ +
  +LightVector ;

: Rel.Light.Vector
  Lights
  Current.Light @ +
  +RelLightVector ;

: Direct.Scale
  Lights
  Current.Light @ +
  +DirectScale ;

: Light.Type
  Lights
  Current.Light @ +
  +LightType ;

decimal

0 constant BMLT                      \ constants for look-up tables
0 constant ZMAP
0 constant RMap
```

-000711

```
: init.sphere.tabs                  \ initializes look-up for sphere shading
  ASCII BMLT 128 GET.RESOURCE ' BMLT !
  BMLT IF                   \ fetch and lock byte multiply
    BMLT LOCK.HANDLE
  THEN
  ASCII ZMAP 128 GET.RESOURCE ' ZMAP !
  ZMAP IF
    ZMAP LOCK.HANDLE              \ fetch and lock z normal lock-up
  THEN
  ASCII RMAP 128 GET.RESOURCE ' RMAP !
  ZMAP IF
    RMAP LOCK.HANDLE              \ fetch and map 6th power byte look-up
  THEN  ;



CODE write.sphere.light                \ writes direct light
  save.regs
   d5 pop, d1 pop, d2 pop, d3 pop, d4 pop,      \ fetch light vector
   d3 long neg,
   d4 long neg,
   d1 8 # long asr,              \ scale from hex 1000 to 80
   9 d0 moveq,
   d2 d0 long asr,              \ scale from hex 1000 to 80
   d3 d0 long asr,
   d4 d0 long asr,
   128 # d1 long add,            \ convert to unsigned 0 to 256
   mi if,
    0 d1 moveq,
   then,
   d1 255 long cmpi, pl if,
    255 # d1 long move,
   then,
   128 # d2 long add,            \ convert to unsigned 0 to 256
   mi if,
    0 d2 moveq,
   then,
   d2 255 long cmpi, pl if,
    255 # d2 long move,
   then,
   128 # d3 long add,
    mi if,
    0 d3 moveq,
   then,
   d3 255 long cmpi, pl if,
    255 # d3 long move,
   then,
   128 # d4 long add,
    mi if,
    0 d4 moveq,
   then,
   d4 255 long cmpi, pl if,
    255 # d4 long move,
   then,
   9 d0 moveq,                \ now scale back up for indexing
   d1 d0 long asl,
   d2 d0 long asl,
   d3 d0 long asl,
   d4 d0 long asl,
   d4 push,                   \ save on stack, z first
   d3 push,
   d2 push,
   0 d2 MOVEQ,                \ init y and x sphere vecs
   ' bmlt a0 )#move,            \ set pointers to tables
```

-000712

```
  a0 () a0 long move,
  a0 () a0 long move,
  ' zmap a1 )#move,
  a1 () a1 long move,
  a1 () a1 long move,
  ^envir.bits a2 )#move,
  a2 () a2 long move,
  a2 () a2 long move,
  255 # d6 long move,           \ set the counter for y
  4 sp I) d2 long move,           \ d0 is x light vector, high index for mult
  begin,
   8 sp I) d3 long move,          \ d0 is x light vector, high index for mult
   255 # d7 long move,          \ set the counter for x
   begin,
     0 d0 moveq,
     0 d4 moveq,
     a1 )+ d0 byte move,          \ d0 is z normal of sphere
     ne if,
       d0 1 # word lsl,
       sp () d0 long add,          \ d0 is z light.vector, high index for mult
       d0 0 long a0 @I) d4 word move,     \ d4 collects the dot product
       d2 0 long a0 @I) d4 word add,      \ d4 has z,y dot product
       d3 0 long a0 @I) d4 word add,      \ d4 is dot product
       pl if,
         d4 7 # word asr,
         d4 128 word addi,          \ fix-up offset
         d4 1 # word asl,
         d1 d4 long add,
         d4 0 long a0 @I) d4 word move,
         d4 6 # word asr,
         0 d0 moveq,
         a2 () d0 byte move,
         d4 d0 word sub,
         d0 d5 word cmp, pl if,       \ clip to 0
           d5 d0 word move,
         then,
         d0 a2 () byte move,        \ set the light value
       then,
     then,
     a2 1 long addq,
     d3 2 long addq,              \ increment x index
   d7 wloop,
   d2 2 long addq,                \ increment y index
 d6 wloop,
 restore.regs
 next end-code


CODE write.sphere.hilight              \ writes direct light
 xsave.regs
  d5 pop, d1 pop, d2 pop, d3 pop, d4 pop,       \ fetch light vector
  d3 long neg,
  d4 long neg,
  d1 8 # long asr,               \ scale from hex 1000 to 80
  9 d0 moveq,
  d2 d0 long asr,               \ scale from hex 1000 to 80
  d3 d0 long asr,
  d4 d0 long asr,
 128 # d1 long add,               \ convert to unsigned 0 to 256
  mi if,
   0 d1 moveq,
  then,
  d1 255 long cmpi, pl if,
   255 # d1 long move,
```

-000713

```
then,
128 # d2 long add,              \ convert to unsigned 0 to 256
mi if,
 0 d2 moveq,
then,
d2 255 long cmpi, pl if,
 255 # d2 long move,
then,
128 # d3 long add,
 mi if,
 0 d3 moveq,
then,
d3 255 long cmpi, pl if,
 255 # d3 long move,
then,
128 # d4 long add,
 mi if,
 0 d4 moveq,
then,
d4 255 long cmpi, pl if,
 255 # d4 long move,
then,
9 d0 moveq,                    \ now scale back up for indexing
d1 d0 long asl,
d2 d0 long asl,
d3 d0 long asl,
d4 d0 long asl,
d4 push,                       \ save on stack, z first
d3 push,
d2 push,
0 d2 MOVEQ,                    \ init y and x sphere vecs
' bmlt a0 )#move,                \ set pointers to tables
a0 () a0 long move,
a0 () a0 long move,
' zmap a1 )#move,
a1 () a1 long move,
a1 () a1 long move,
' rmap a4 )#move,
a4 () a4 long move,
a4 () a4 long move,              \ a4 is pointer to 6th power look-up
^envir.bits a2 )#move,
a2 () a2 long move,
a2 () a2 long move,
255 # d6 long move,              \ set the counter for y
4 sp I) d2 long move,              \ d0 is x light vector, high index for mult
begin,
 8 sp I) d3 long move,              \ d0 is x light vector, high index for mult
 255 # d7 long move,             \ set the counter for x
 begin,
   0 d0 moveq,
   0 d4 moveq,
   a1 )+ d0 byte move,           \ d0 is z normal of sphere
   ne if,
     d0 1 # word lsl,
     sp () d0 long add,           \ d0 is z light.vector, high index for mult
     d0 0 long a0 @I) d4 word move,     \ d4 collects the dot product
     d2 0 long a0 @I) d4 word add,      \ d4 has z,y dot product
     d3 0 long a0 @I) d4 word add,      \ d4 is dot product
     pl if,
       d4 7 # word asr,
       d4 0 word a4 @i) d4 byte move,  \ look-up dot.product to 6th power
       d4 128 word addi,          \ fix-up offset
       d4 1 # word asl,
       d1 d4 long add,
```

-000714

```
        d4 0 long a0 @I) d4 word move,
        d4 6 # word asr,
        0 d0 moveq,
        a2 () d0 byte move,
        d4 d0 word sub,
        d0 d5 word cmp, pl if,      \ clip to 0
          d5 d0 word move,
        then,
        d0 a2 () byte move,       \ set the light value
      then,
    then,
    a2 1 long addq,
    d3 2 long addq,             \ increment x index
  d7 wloop,
  d2 2 long addq,              \ increment y index
 d6 wloop,
 xrestore.regs
 next end-code


code average.sphere
 ^envir.bits a0 )#move,
  a0 () a0 long move,
  a0 () a0 long move,
  256 256 * 256 - 1 - # d2 long move,
  begin,
   0 d1 moveq,
   0 d0 moveq,
   a0 () d0 byte move,
   1 a0 I) d1 byte move,
   d1 d0 word add,
   256 a0 I) d1 byte move,
   d1 d0 word add,
   257 a0 I) d1 byte move,
   d1 d0 word add,
   d0 2 # word asr,
   d0 a0 )+ byte move,
  d2 loop,
  next end-code


( W.FROM.STACK,  W.TO.STACK, ZSCALE )              ( 011138 YH )

   CODE V.FROM.STACK
      A0 POP, 02 SP I)  A0 )+  WORD MOVE,
              06 SP I)  A0 )+  WORD MOVE,
              10 SP I)  A0 )+  WORD MOVE,
      SP 6 LONG ADDQ, SP 6 LONG ADDQ, NEXT END-CODE

   CODE V.TO.STACK
      A0 POP,    A0 )+ D0 WORD MOVE, D0 LONG EXT,
                 A0 )+ D1 WORD MOVE, D1 LONG EXT,
                 A0 )+ D2 WORD MOVE, D2 LONG EXT,
    D2 PUSH, D1 PUSH, D0 PUSH, NEXT END-CODE



( GET.COS, PUT COS, )                              ( 112385 YH )
 code  GET.COS    A0 POP,
      A0 () D0 WORD MOVE, D0 WORD EXT,  D0 PUSH,
      02 A0 I) D0 WORD MOVE, D0 WORD EXT, D0 PUSH,
      04 A0 I) D0 WORD MOVE, D0 WORD EXT, D0 PUSH,
      06 A0 I) D0 WORD MOVE, D0 WORD EXT, D0 PUSH,
```

-000715

```
     08 A0 I) D0 WORD MOVE, D0 WORD EXT, D0 PUSH,
     10 A0 I) D0 WORD MOVE, D0 WORD EXT, D0 PUSH,
     NEXT END-CODE

CODE  PUT.COS
      A0 POP, D0 POP,  D0 10 A0 I) WORD MOVE,
      D0 POP,  D0 08 A0 I) WORD MOVE,
      D0 POP,  D0 06 A0 I) WORD MOVE,
      D0 POP,  D0 04 A0 I) WORD MOVE,
      D0 POP,  D0 02 A0 I) WORD MOVE,
      D0 POP,  D0 A0 () WORD MOVE,   NEXT END-CODE

( CIRCLE.SET, LIGHT.SET, VIRTUAL JOYSTICK UTILS ) ( 091985 YH )


: MAKE.NEG.ANGLE
   LOCALS| THE.ANGLE |
   THE.ANGLE FULL.ANGLE 2/  > IF
    THE.ANGLE FULL.ANGLE  -
    TO THE.ANGLE
  THEN
  THE.ANGLE ;


64 constant radius
radius 2* dup * constant Radius2


: SPHERE.VECTOR          \ x y -- NORMAL X Y Z
   -2 * swap -2 * swap
  2dup dup * swap dup *
  Radius2 swap - swap - abs
  NSQRT
  NORMALIZE
  ;

 VARIABLE SAVE.COS 12 ALLOT


( VECTOR.GET / GETS VECTRO FROM VIRTUAL JOYSTICK  ( 051186 YH )

  : CONSTRAIN   2DUP      \ constrains to radius of sphere
    dup * swap dup * +
    sqrt EXT
    DUP Radius2 4-  > if
    >R  Radius2 4-  *
      R@ / SWAP
    Radius2 4- * R>
    / SWAP
    ELSE
    DROP
  THEN  ;


    : In.circle          \ x y -- flag, true if in circle
      dup * swap dup * +
      sqrt EXT
      radius > not ;


 ( DISPLAY / DRAWS CIRCLES FOR JOYSTICKS )        ( 051186 YH )
```

```
\ define light.vector window

 80 CONSTANT SPOT.SIZE
 VARIABLE LIGHT.SPOT  100 ALLOT     \ array of points for circle
 VARIABLE L.CNT

:  SET.LIGHT.SPOT          \ initialize array
   LIGHT.SPOT L.CNT !
   FULL.ANGLE  0 DO
       I SIN SPOT.SIZE 4/  * COS.SCALER /
     I COS SPOT.SIZE 4/  * COS.SCALER / radius dup 12 / - neg
       L.CNT @  V.FROM.STACK
       6 L.CNT @ + L.CNT !
   60 ANGLE.SCALE  * +LOOP  ;


 : VECTOR>COSINE           \ NORMAL X Y Z -- SETS COSINES
  SET.TEST.VEC
  -4 SCALE       TEST.VEC 24 + !
    -4 SCALE       TEST.VEC 28 + !
    -4 SCALE       TEST.VEC 32 + !
    GET.ATTITUDE
  T.VARS COSINES COS.LENGTH CMOVE
  0 ROL ;

                                                   ( 110686 YH )
 : SET.LCOS          \ sets cosines for rotation from current vector
   LIGHT.VECTOR TO.STACK
   VECTOR>COSINE ;



 : START.LIGHT.CURSOR
  @MOUSEXY
  CONSTRAIN
  SPHERE.VECTOR
  VECTOR>COSINE
  COSINES C.START.COS COS.LENGTH CMOVE
  LIGHT.VECTOR TO.STACK
  UN.SWIVEL
  START.VECTOR FROM.STACK  ;


 2 BASE !
  CREATE STRIPE   11001100 C,
          01100110 C,
          00110011 C,
          10011001 C,
          11001100 C,
          01100110 C,
          00110011 C,
          10011001 C,

 DECIMAL

  :  DRAW.LIGHT.SPOT
    LIGHT.SPOT  V.TO.STACK
    SWIVEL DROP 2DUP MOVE.TO
    6 6 *  6 DO
    I LIGHT.SPOT + V.TO.STACK
    SWIVEL DROP   DRAW.TO
```

-000717

```
  6 +LOOP  DRAW.TO  ;


: (ROTATE.SPOT)            \ transforms and displays circle
  1 1 PENSIZE
  SET.LCOS
  LIGHT.VECTOR TO.STACK 0 > NOT IF
   STRIPE PENPAT
   DRAW.LIGHT.SPOT
   ELSE
   BLACK PENPAT
   DRAW.LIGHT.SPOT
  THEN  2DROP
  1 1 PENSIZE
  BLACK PENPAT
   ;

: ROTATE.SPOT              \ transforms and displays circle
  80 80 xyoffset
  (ROTATE.SPOT)
  0 0 xyoffset
   ;


create LAST.COSINE COS.LENGTH ALLOT
 10  CONSTANT MOVE.THRESH

: CALC.NEW.VECTOR
 LOCALS| M.Y M.X |
 SET.TEST.VEC
 M.X M.Y
 CONSTRAIN
 SPHERE.VECTOR
 VECTOR>COSINE
 START.VECTOR TO.STACK
 SWIVEL
 NORMALIZE
 LIGHT.VECTOR FROM.STACK
  ;

: SET.RELATIVE.LIGHT.VECTOR
 CURRENT.OBJECT @ >R
 WORLD.OBJECT SET.CURRENT.OBJECT
 object.state pluck 0 > if
   OBJECT.RCOS COSINES SWAP MOVE.RECORD
   LIGHT.VECTOR TO.STACK
   UN.SWIVEL
   NORMALIZE
   REL.LIGHT.VECTOR FROM.STACK
 then
 R> SET.CURRENT.OBJECT  ;


: SET.RELATIVE.LIGHTS
 current.light @ light.record /
 locals| the.light |
 lights# 0 do
   I SetCurrentLight
   Light.Type @ 1 and if
     SET.RELATIVE.LIGHT.VECTOR
   then
 loop
 the.light SetCurrentLight ;
```

```
: MOVE.UNCLICK          \ waits for mouse delta to reduce flicker
  @MOUSE
  BEGIN
  DUP  @MOUSE  = NOT
    MOUSE.BUTTON NOT OR UNTIL
  DROP ;


VARIABLE SAVE.LIGHT.COS COS.LENGTH ALLOT



 :  (SET.ABSOLUTE.LIGHT.VECTOR)
  LIGHT.LOCK @ IF
    WORLD.OBJECT SET.CURRENT.OBJECT
    OBJECT.RCOS COSINES SWAP MOVE.RECORD
    REL.LIGHT.VECTOR TO.STACK
    SWIVEL
    NORMALIZE
    LIGHT.VECTOR FROM.STACK
  THEN
  ;


 : HANDLE.LIGHT.CURSOR
  80 80 xyoffset
  @Mousexy
  IN.CIRCLE IF
    START.LIGHT.CURSOR
      BEGIN
    @MOUSEXY
    CALC.NEW.VECTOR
    (ROTATE.SPOT)
    MOVE.UNCLICK
        (ROTATE.SPOT)
      MOUSE.BUTTON
      NOT
  UNTIL
   then
  0 0 xyoffset
   ;


 set.light.spot

: init.light.record
  100 100 100 normalize
  light.vector from.stack
  0 light.type !
  cos.scaler 4 / direct.scale !
  WHITE.RGB @RGB
  Lights Current.Light @ + +LightRGB !RGB  ;


: INIT.LIGHTS
  lights light.record lights# * erase
  current.light @ light.record /
  locals| the.light
  lights# 0 do
```

-000719

```
  I setcurrentlight
  init.light.record
 loop
 1 SetCurrentLight
  40 -75 -53 normalize
 Rel.Light.Vector from.stack
  40 -75 -53 normalize
 Light.Vector from.stack
 1 light.type !
 cos.scaler 4 / direct.scale !
 0 SetCurrentLight
  -40 75 53  normalize
 Rel.Light.Vector from.stack
  -40 75 53  normalize
 Light.Vector from.stack
 1 light.type !
 cos.scaler 5 6 */ direct.scale !
 Light.Record lights# * FROM.MIN.HEAP
 LightHand !
 LightHand @ if
   lights LightHand @ @ Light.Record lights# * cmove
 else
   add.memory.failed
 then  ;


: get.lights
  LightHand @ if
    LightHand @ to.heap
    0 LightHand !
  then
  Ascii LUXO 128 Get.Resource LightHand !
  LightHand @ 0> if
    LightHand @ detach.resource
    LightHand @ @ lights Light.Record lights# * cmove
  else
    INIT.LIGHTS
  then
   ;

: Put.lights
  LightHand @ if
    LightHand @
    Ascii LUXO
    128 ""
    Add.Resource
    Res.Error ?dup if
      to error.flag
    then
    LightHand @ write.resource
    LightHand @ detach.resource
  then ;
```

```
Informational

About.Swivel

0  200 PrintResString   \ ." Kbytes Free of"
1  200 PrintResString   \ ." Kbytes"
2  200 PrintResString   \  ." Objects Used: "
3  200 PrintResString   \." Objects Remaining: "
4  200 PrintResString   \." Number of Polygons:"


Warnings

BootHandling

0  201 ResString      \ " This version of Swivel cannot open this file. You need an Upgrade ! "
1  201 ResString      \ " Swivel has been changed or infected by a virus. "

File Menu
2  201 ResString      \ "There is not enough memory to open a new file. "
3  201 ResString      \ " Please close a document before opening a new one. "

Materials1

4  201 ResString      \ " Unable to update materials! Out of Memory, Try Resizing Workspace"

Object Scrap

5  201 ResString      \ " The scrap version is too new, new version of Swivel ... "

32 Display

6 201 ResString     \ " Unable to display a 32 bit image on this device ... "
Menus1

Edit.Menu

0 202 ResString       \ " -(;Duplicate /D;Duplicate Link /L"
1 202 ResString       \ " -(;Paste Command /7;Paste Background /8;Clear Background /9"
2 202 ResString       \ " -(;Find.../F;info... /6;Inherit.../I;Output Style...;"

File Menu
3 202 ResString       \ " File"
4 202 ResString       \ " New/N;Open/O;Open Command File;-(;Close;Save/S;Save As;Export File... ;Revert
5 202 ResString       \ " Halftone...;Page Setup...;Print.../P;-(;Quit/Q"

Interface

6 202 CreateResString "UNDO         \ " Undo"
7 202 CreateResString "UNDO.MOVE       \ " Undo Move"
8 202 CreateResString "UNDO.NEW      \ " Undo New Object"
9 202 CreateResString "UNDO.DUP        \ " Undo Duplicate"
11 202 CreateResString  "UNDO.DRAWING      \ " Undo Drawing"
12 202 CreateResString  "UNDO.DELETE     \ " Undo Clear"
13 202 CreateResString  "UNDO.UNLINK     \ " Undo Un-Link"
14 202 CreateResString  "UNDO.LINK       \ " Undo Link"
15 202 CreateResString  "UNDO.PASTE      \ " Undo Paste"
16 202 CreateResString  "UNDO.EDIT       \ " Undo Edit "
17 202 CreateResString  "UNDO.UNDO       \ " Undo Undo"
18 202 CreateResString  "UNDO.ZOOM       \ " Undo Zoom"
19 202 CreateResString  "UNDO.WORLD.MOVE  \ " Undo World Move"
20 202 CreateResString  "UNDO.FORM       \ " Undo Form Change"
```

-000721

```
21 202 CreateResString  "UNDO.PALETTE    \ " Undo Palette Color"
22 202 CreateResString  "UNDO.COLOR     \ " Undo Color Change "

light Panel

23 202 ResString        \ " Undo Lighting Change"

ObjectMenu
24 202 ResString        \ " Design New Object..."
25 202 ResString        \ " Redesign Object..."
26 202 ResString        \ " Object "
27 202 ResString        \ " Redesign Object.../R;Create Skin Object;-("
28 202 ResString        \ " Object Position.../W;Object Attitude.../E;-("
29 202 ResString        \ " Align Object;Object's View "
30 202 ResString        \ " -(;Rulers...;Attitude Grid...;Object Form...;Isaac Flags...;-("
31 202 ResString        \ " Use Draw Grid;Polar Grid;Show Rulers"
32 202 ResString        \ " Return to World..."
33 202 ResString        \ " Front;Back;Left;Right;Top;Bottom"
34 202 ResString        \ " Align All;Align Attitude;Align Position"
35 202 ResString        \ -(;Rulers...;Attitude Grid...;Object Form...;Isaac Flags...;-(


Menus2

Render.Menu

0 204 ResString        \ " Effects "
1 204 ResString        \ " Open Tween Panel;Open Light Panel;-("
2 204 ResString        \ " Effects.../G;Effects Render/H;-(;Remap Color;Select Color/U;-(;"
3 204 ResString        \ " Set Key/1;Add Key/2;Clear Key/3;Next Key/4;Last Key 5"
4 204 ResString        \ " Tween/T;Preview/Y"
5 204 CreateResString open.tweenS     \ " Open Tween Panel"
6 204 CreateResString create close.tweenS \ " Close Tween Panel"
7 204 CreateResString create open.lightS  \ " Open Light Panel"
8 204 CreateResString create close.lightS \ " Close Light Panel"

Shade Menu

9 204 ResString        \ " Render "
10 204 ResString       \ "   Resize Work Space...;  Render separately ;  Orthographic;  Fast Shade"
11 204 ResString       \ " -(; ^1 Wireframe; ^2 Hidden Line; ^3 Outline Shade; ^4 Shade; ^5 Smooth;"

World Menu
12 204 ResString       \ " World "
13 204 ResString       \ " World Position...;World Attitude...;-(;World View;View Angle"
14 204 ResString       \ " -(;Normal Size;Reduce;Enlarge;Size To Fit"
15 204 ResString       \ " -(;World Grid "
16 204 ResString       " Front;Back;Left;Right;Top;Bottom"
17 204 ResString       \ " View Angle "
18 204 ResString       \ " Very Wide Angle;Wide Angle;Moderate Angle;Narrow Angle"
19 204 ResString       \ " Edit"
20 204 ResString       \" Undo/Z;-(;Cut/X;Copy/C;Paste/V;Clear"
```

-000722

```
Files

Eps Files

0 203 ResString        \ "..eps" APPEND.TITLE
1 203 ResString        \ " EPS File "

File.Utils
```

```
2 203 ResString       \ "   . Object Drawing"
3 203 ResString       \ "   . World"
4 203 ResString       \ " Untitled"
5 203 ResString       \ " Save Changes to  "
6 203 ResString       \ "  Please choose another place to put the scratch file..."
7 203 ResString       \ " Scratch File "
8 203 ResString       \ " Unable to Save: "
9 203 ResString       \ "    an error has occured. "
10 203 ResString      \ " select the document  "
11 203 ResString      \ " Save Under What Name?"

Material Edit

12 203 ResString      \ " Open PICT File "

Object.Attitude

13 203 ResString      \ "   . Attitude"

Object.Position

14 203 ResString      \ "   . Position"
15 203 ResString      \ " PICT File"

Text Parse

16 203 ResString      \ " Open Command File "

Write Pics

17 203 ResString      \ " PICS File "
18 203 ResString      \ " Save as Scrapbook"
19 203 ResString      \ " dxf for AutoCad"
20 203 ResString      \ " TEXT for Excel "
21 203 ResString      \ " Isaac File "
22 203 ResString      \ " PNTG File "
23 203 ResString      \ " RenderMan File "
```

6/1/90 20:07 Swivel Gdevice Palette Page 1

```
\ COLOR PALETTE HANDLING

ANEW --SWIVEL.PALETTES--

." Loading Palette Handling..." CR


\ swivel colors con be set to two different background modes:
\ 1. monochrome
\ 2. key object colors
\ a color table in the resource of the current file specifies which of these
\ modes will be used and the colors that accompany the modes

\ monochrome
\ if the CTSize field of the color table is 255, monochrome mode is set
\ the colors that are listed are the monochrome color range with 0= white and
\ 256 = black  these colors can be placed directly into the color map of the
\ background gdevice

\ Key Object Colors
\ If the CTSize field of the color table is less than 64, key object color mode is set.
\ The colors that are listed are used to assemble the color map of the gdevice. Each of
\ the key colors specifies a range of color shades to be applied to objects with that
\ color index.


\ palette routines

hex

AA92  W>FUNC>L  GetNewPalette   ( PaletteID -- PaletteHandle )
AA93  MT    DisposePalette    ( srcPalette --  PaletteHandle )
AA94  MT    ActivatePalette   ( srcWPTR -- )
AA95  W>MT    SetPalette      ( dstWPTR\srcPaletteHndl\cUpdates -- )
AA96  L>FUNC>L  GetPalette      ( wptr -- palettehandle )
AA97  W>MT    PmForeColor     ( dstEntry -- )
AA98  W>MT    PmBackColor     ( dstEntry -- )
AA9F  2W>MT   CTab2Palette    ( SrcTabHandle\dstPaletteHandle )
                  (      \srcusage\srstolerence -- )
AAA0  MT    Palette2CTab    ( srcPaletteHandle\dstCtabHandle -- )


<Code NewPalette  ( entries\SrcColorsHandle\srcusage\srstolerence )
          ( -- pallete handle )
  4CDF0007 , 3F2F0002 , 2F023F01 , 3F00AA91 , next,

decimal


0 CONSTANT SWIV.TOLERANCE
2 CONSTANT SWIV.USAGE


: INIT.SWIV.PALETTE              \ -- creates a new palette and sets global SWIV.PALETTE
  SWIV.PALETTE @ 0= IF           \ if palette does not exist yet...
    256 0  SWIV.USAGE
    SWIV.TOLERANCE NEWPALETTE      \ create a new palette
    SWIV.PALETTE !
  THEN
  SWIV.PALETTE @ 0= IF           \ if palette is not there...
    -108 TO ERROR.FLAG
    DO.ERROR.ALERT             \ post an error
```

-000724

```
THEN ;


: SET.PALETTE.WINDOW             \ -- Sets Swiv.Palette to the current world window
GET.WINDOW LOCALS| THE.WIN PAL.WIN     \ define locals
PAL.WIN ?ACTIVE.WPTR IF          \ if world output is active
  PAL.WIN WINDOW              \ set world output as current window
  SWIV.PALETTE @ HANDLE.SIZE 0 >     \ if the palette exists...
  POLY.DEPTH @ 8 = AND IF        \ and if its in color...
    PAL.WIN
    SWIV.PALETTE @ -1 SETPALETTE   \ set the palette to this window
    PAL.WIN ACTIVATEPALETTE      \ activate the palette
  THEN
  THE.WIN ?ACTIVE.WPTR IF
    THE.WIN  (WINDOW)          \ reset the previous window
  THEN
THEN ;


: SET.SWIV.COLORS                   \ initialize the SWIV.COLORS
   SWIV.COLORS @ 0= IF
   GET.SWIV.CLUT
  THEN
   MONOCHROME?   IF                \ is it monochrome?
     256 KEY.COLOR.RES !              \ set the res
   ELSE
     256
     SWIV.COLORS @ @ +CTSIZE W@ EXT 1+ /
     KEY.COLOR.RES !                  \ calc the resolution of the shade
   THEN  ;


:  SET.KEY.SHADES
  2 NEEDED
    dup  @RGB 0 0 0
  LOCALS| TEMP.SHADE C.SHADE  O.SHADE  O.BLUE O.GREEN O.RED  KEY.RGB MAP.RGB
   O.BLUE O.GREEN + O.RED + 3 /
  Key.Color.Res @  COLOR.SCALE */
  Key.Color.Res @ SWAP -
  to TEMP.SHADE                \ index of actual color
  TEMP.SHADE   0 DO
      COLOR.SCALE O.RED - I TEMP.SHADE */   \ fade from white
      COLOR.SCALE SWAP -
    COLOR.SCALE O.GREEN - I TEMP.SHADE */
      COLOR.SCALE SWAP -
    COLOR.SCALE O.BLUE - I TEMP.SHADE */
      COLOR.SCALE SWAP -
    MAP.RGB !RGB
    MAP.RGB COLORSPEC - TO MAP.RGB
  LOOP
  Key.Color.Res @ TEMP.SHADE - to o.shade
  O.SHADE 0   Do                   \ fade from black
    O.RED    O.SHADE I - O.SHADE */
    O.GREEN  O.SHADE I - O.SHADE */
    O.BLUE   O.SHADE I - O.SHADE */
    MAP.RGB !RGB
    MAP.RGB COLORSPEC + TO MAP.RGB
  LOOP ;


: RGB@INDEX
```

-000725

```
  LOCALS| THE.INDEX |
  SWIV.COLORS @ 0= IF
    GET.SWIV.CLUT
  THEN
  SWIV.COLORS @ @ +CTTABLE                 \ address of spec array
  THE.INDEX COLORSPEC * +                  \ address of index in array
  +CSRGBCOLOR @RGB ;


: RGB!INDEX
  LOCALS| THE.INDEX |
  SWIV.COLORS @ 0= IF
    GET.SWIV.CLUT
  THEN
  SWIV.COLORS @ @ +CTTABLE                 \ address of spec array
  THE.INDEX COLORSPEC * +                  \ address of index in array
  +CSRGBCOLOR !RGB ;


: KEY.COLOR>CLUT                          \ sets the gdevice for one color key
  0 0 0 0 LOCALS| MAP.RGB KEY.RGB THE.MAP THE.CLUT THE.INDEX      \ set locals
  BACK.GDEVICE @ @ +GDPMAP @  TO THE.MAP            \ find the gdevice pixmap
  THE.MAP @ +PMTABLE @ TO THE.CLUT               \ find the gdevice clut
  SWIV.COLORS @ LOCK.HANDLE                     \ lock the swiv.colors
  THE.CLUT LOCK.HANDLE                        \ lock the gdevice clut
  SWIV.COLORS @ @ +CTTABLE                     \ address of spec array
  THE.INDEX COLORSPEC * +                      \ address of index in array
  +CSRGBCOLOR TO KEY.RGB                       \ key.rgb is the source rgb color
  THE.CLUT @ +CTTABLE                         \ address of spec array
  THE.INDEX Key.Color.Res @ * COLORSPEC * +           \ address of index in array
  +CSRGBCOLOR TO MAP.RGB                       \ map.rgb is the destination
  MAP.RGB KEY.RGB  SET.KEY.SHADES                 \ set the shades
  THE.CLUT UNLOCK.HANDLE                       \ unlock the gdevice clut
  SWIV.COLORS @ UNLOCK.HANDLE   ;                 \ unlock swiv.colors


: BUILD.KEY.SHADOW.TABLE
  COLOR.SCALE SHADOW.SCALE -
  0 LOCALS| the.inc SHADOW.FAX
  256 0 DO                           \ loop for the number of keys
    I Key.Color.Res @ MOD
    to the.inc
    Key.Color.Res @ 1- the.inc -
    SHADOW.FAX color.scale */
    to the.inc
    Key.Color.Res @ 1- the.inc -
    I Key.Color.Res @ / Key.Color.Res @ * +
    SHADE.INDEX I +  C!                  \ set this one index into the gdevice clut
  LOOP ;


: SET.KEY.COLOR.CLUT                    \ sets all color keys into the gdevice clut
  0 0 LOCALS| THE.MAP THE.CLUT                \ make space for locals
  SWIV.COLORS @ @ +CTSIZE W@ 1+ 0 DO              \ loop for the number of keys
    I KEY.COLOR>CLUT                   \ set this one index into the gdevice clut
  LOOP
  BACK.GDEVICE @ @ +GDPMAP @  TO THE.MAP              \ find the gdevice pixmap
  THE.MAP @ +PMTABLE @ TO THE.CLUT
  THE.CLUT @ +CTSEED @ 8 -
  THE.CLUT @ +CTSEED !                   \ change the seed
  WHITE.RGB @RGB
  THE.CLUT @ +CTTABLE +csRGBColor !RGB
  BLACK.RGB @RGB                   set the white
  THE.CLUT @ +CTTABLE
```

-000726

T

```
 255 ColorSpec * -  +csRGBColor !RGB           \ set the.black
 BUILD.KEY.SHADOW.TABLE ;


: BUILD.MONO.SHADOW.TABLE
 COLOR.SCALE SHADOW.SCALE -
 LOCALS| SHADOW.FAX |
 256 0 DO                          \ loop for the number of keys
   255 I -
   SHADOW.FAX color.scale */
   255 swap -
   SHADE.INDEX I +  C!                  \ set this one index into the gdevice clut
 LOOP ;


: SET.MONOCHROME.MAP               \ sets a monochrome color set into the gdevice clut
 0 0 LOCALS| THE.MAP THE.CLUT |          \ make space for locals
 BACK.GDEVICE @ @ +GDPMAP @  TO THE.MAP      \ find the Pixmap for the background gdevice
 THE.MAP @ +PMTABLE @ TO THE.CLUT        \ find the clut for the gdevice
 SWIV.COLORS @ @ +CTTABLE             \ address to the start of the source spec array
 THE.CLUT @ +CTTABLE                \ address to the start of the dest spec array
 THE.CLUT @ +CTSIZE W@ 1+ COLORSPEC *  CMOVE   \ move the entire array
 THE.CLUT @ +CTSEED @ 8 +
 THE.CLUT @ +CTSEED !               \ change the seed
 WHITE.RGB @RGB
 THE.CLUT @ +CTTABLE +csRGBColor !RGB
 BLACK.RGB @RGB                   \ set the white
 THE.CLUT @ +CTTABLE
 255 ColorSpec * +  +csRGBColor !RGB        \ set the.black
 BUILD.MONO.SHADOW.TABLE ;


 : SWIV.COLORS>BACKGDEVICE             \ set the Swiv.Colors into the Background Gdevice
 MONOCHROME? IF
   SET.MONOCHROME.MAP
 ELSE
   SET.KEY.COLOR.CLUT
 THEN
  ;


:  BACKGDEVICE>PALETTE               \ create and set a palette for the window [illegible]
 0 0 LOCALS| THE.MAP THE.CLUT            \ make room for locals
 INIT.SWIV.PALETTE               \ make sure we have a palette out there
 BACK.GDEVICE @ @ +GDPMAP @  TO THE.MAP      \ find the map for the back Gdevice
 THE.MAP @ +PMTABLE @ TO THE.CLUT         \ find the clut for the back Gdevice
 THE.CLUT SWIV.PALETTE @
 SWIV.USAGE SWIV.TOLERANCE CTAB2PALETTE      \ set the palette to the clut value
 WORLD.OUTPUT SET.PALETTE.WINDOW ;



 : (SET.DEFAULT.COLOR)
   0 OBJECT.PALETTE.INDEX PLACE
   0 RGB@INDEX OBJECT.RGBCOLOR DROP
   !RGB  ;

 token.for (SET.DEFAULT.COLOR) ' ^SET.DEFAULT.COLOR !


 NULL.TOKEN  ' ^SET.OBJECT.COLOR.INDEX !       \ set the write to the object array to [illegible]


  : INIT.WINDOW.PALETTE
```

-000727

```
      BACK.GDEVICE @ IF
        SET.SWIV.COLORS
        SWIV.COLORS>BACKGDEVICE
        BACKGDEVICE>PALETTE
      THEN ;

2 base !
  1110000000000000 CONSTANT COLOR.MASK
 DECIMAL


: RGB.MATCH
  >R @RGB R> @RGB
  LOCALS| R1 G1 B1 R2 G2 B2 :
  R1 COLOR.MASK AND R2 COLOR.MASK AND =
  G1 COLOR.MASK AND G2 COLOR.MASK AND = AND
  B1 COLOR.MASK AND B2 COLOR.MASK AND = AND ;


: RGB.IN.INDEX?
  0 0 LOCALS| end.flag MATCH.FLAG THE.RGB
  SWIV.COLORS @ @ +CTSIZE W@ 1+ EXT 0 DO
    THE.RGB
    SWIV.COLORS @ @ +CTTABLE              \ ADDRESS OF SPEC ARRAY
    I COLORSPEC * +                       \ ADDRESS OF INDEX IN ARRAY
    +CSRGBCOLOR RGB.MATCH TO MATCH.FLAG
    MATCH.FLAG IF
      I OBJECT.PALETTE.INDEX PLACE
      MATCH.FLAG TO end.flag
    THEN
  LOOP
  end.flag ;


: RGB.TO.INDEX
  0 LOCALS| THE.INDEX THE.RGB
  SWIV.COLORS @ @ +CTSIZE W@ 1- TO THE.INDEX
    THE.INDEX 15 MIN TO THE.INDEX
  THE.INDEX SWIV.COLORS @ @ +CTSIZE W!
  THE.RGB @RGB
  SWIV.COLORS @ @ +CTTABLE                \ address of spec array
  THE.INDEX COLORSPEC * +                 \ address of index in array
  +CSRGBCOLOR !RGB
  THE.INDEX OBJECT.PALETTE.INDEX PLACE  ;


 : ENTER.OBJECT.RGB
  OBJECT.RGBCOLOR DROP RGB.IN.INDEX? NOT IF
  OBJECT.RGBCOLOR DROP RGB.TO.INDEX THEN ;


: ENTER.WORLD.RGB
  OPERATION @
  CURRENT.OBJECT @
  0 LOCALS| THE.INDEX THE.OBJECT THE.OP |
  0 TO MONOCHROME?
  SWIV.COLORS @ 0= IF
    GET.SWIV.CLUT
  THEN
  0 SWIV.COLORS @ @ +CTSIZE W!
  white.rgb @rgb  0 RGB!INDEX
  WORLD.OBJECT SET.CURRENT.OBJECT
  TOKEN.FOR ENTER.OBJECT.RGB OPERATION !
```

-000728

```
TRAVERSE.DOWN.TREE
THE.OP OPERATION !
THE.OBJECT SET.CURRENT.OBJECT
SWIV.COLORS @ @ +CTSIZE W@ TO THE.INDEX
THE.INDEX  2 < IF
  1 TO THE.INDEX
ELSE
  THE.INDEX  4 < IF
    3 TO THE.INDEX
  ELSE
    THE.INDEX  8 < IF
      7 TO THE.INDEX
    ELSE
      THE.INDEX  16 < IF
        15 TO THE.INDEX
      THEN
    THEN
  THEN
THEN
THE.INDEX SWIV.COLORS @ @ -CTSIZE W!  ;


 : SET.KEY.OBJECT
  0 OBJECT.PALETTE.INDEX PLACE
  OBJECT.RGBCOLOR DROP RGB.IN.INDEX?
  DROP
  set.reflect            \ in interface.utils
  OBJECT.CHANGED ;


 : GET.KEY.OBJECT
  OBJECT.PALETTE.INDEX PLUCK
  RGB@INDEX
  OBJECT.RGBCOLOR DROP !RGB
  ;


: SET.KEY.WORLD
 OPERATION @
 CURRENT.OBJECT @
 0 LOCALS| THE.INDEX THE.OBJECT THE.OP
 WORLD.OBJECT SET.CURRENT.OBJECT
 TOKEN.FOR SET.KEY.OBJECT OPERATION !
 TRAVERSE.DOWN.TREE
 THE.OP OPERATION !
 THE.OBJECT SET.CURRENT.OBJECT ;


 : CALC.MONO.INDEX
 set.reflect           \ in interface.utils
 0 object.palette.index place ;


: SET.MONO.WORLD
 OPERATION @
 CURRENT.OBJECT @
 0 LOCALS| THE.INDEX THE.OBJECT THE.OP
 WORLD.OBJECT SET.CURRENT.OBJECT
 TOKEN.FOR CALC.MONO.INDEX  OPERATION !
 TRAVERSE.DOWN.TREE
 THE.OP OPERATION !
 THE.OBJECT SET.CURRENT.OBJECT ;
```

```
: SET.WORLD.PALETTE.INDEX
MONOCHROME? NOT IF
  SET.KEY.WORLD
ELSE
  SET.MONO.WORLD
THEN ;

: GET.KEY.WORLD
OPERATION @
CURRENT.OBJECT @
0 LOCALS| THE.INDEX THE.OBJECT THE.OP
WORLD.OBJECT SET.CURRENT.OBJECT
TOKEN.FOR GET.KEY.OBJECT OPERATION !
TRAVERSE.DOWN.TREE
THE.OP OPERATION !
THE.OBJECT SET.CURRENT.OBJECT ;
```

6/1/90 20:07 SWIVIpc Page 1

```
\ ipc handling for the swiv

create EditArray 0 , 0 , 0 , 0 , 0 , 0 , 0 , 0 , 0 , 0 , 0 ,

create ValidString ," Unauthorized use is subject to legal action."

create last.bye 0 ,

: doBeforeSuspend
  inBackground on
  in.object.drawing @ if
    PUT.OBJECT.DRAWING
    0 IN.OBJECT.DRAWING !
  then
;
  find doBeforeSuspend  before.suspend !

: doBeforeResume
  inBackground off
;
  find doBeforeResume  before.resume !



: ValidEditor
  0 0 locals| theFlag theEditor theIPC
  theIPC @ 2- w@ to theEditor
  EditArray @  0 do
    EditArray i 1- 4* + @ theEditor  if
      -1 to theflag
    then
  loop
  theflag 0=
  theIPC @ 8+ w@ 10 = and if
    theIPC @ 16 + @ @ ValidString -string 0= if
      EditArray @ 1+ 10 min EditArray !
      theEditor EditArray @ 4* EditArray + !
      -1 to theFlag
    then
  then
  theFlag
;

: CheckXEdit
  0 locals| theXEdit |
  ascii XEDT 1 Get.Resource to theXEdit
  theXEdit if
    XEditExits ON
  then
;
find CheckXEdit ' ^InitXEditors !

: initXEditMenu
  0 locals| theXEdit
  XEditExits @ if
    0 temp.string c!
    10 1 do
    ascii XEDT i Get.Resource to theXEdit
      theXEdit if
        theXEdit @ 5 +
        temp.string dup c@ 1+ +
        theXEdit @ 4+ C@ cmove
        theXEdit @ 4+ C@ temp.string C@ +      \ concat new editor name
        temp.string C!
```

-000731

```
        ascii ;                     add  ;
        temp.string dup c@ 1+ + c!
        1 temp.string C@ -
        temp.string C!
      then
    loop
    temp.string c@ 0 = not if
      temp.string c@ 1 - temp.string c!       \ strip end ;
    then
    temp.string OBJECT.MENU APPEND.ITEMS
  then
;

find initXEditMenu  ' ^InitXEditorMenu !


: CheckinObject
  locals| thesize theMod theHandle
  theHandle 0 = not if
  theHandle @ ' Object.Index @ - w@ Set.Current.Object
  current.size  thesize = if
    theHandle @ current.handle @ thesize cmove
    object.changed
  else
    thesize RESIZE.RES.RECORD if
      theHandle @ current.handle @ thesize cmove
      object.changed
    then
  then
  get.object
  theMod 4 and if
    CUBE.FLAG @  0= IF
      THREE.LIST
    THEN
        HIDE.CURSOR
      TICKCOUNT
      NPOLY.FRAME
      UPDATE.LINK  REDRAW
      RE.TOGGLE    REDRAW
      TICKCOUNT SWAP -
      LCURSOR.TIME  <  IF
          LINK.TIME @INC THEN
      SHOW.CURSOR
  then

  theMod 1 and if
    Draw.tree display.world
  then
  theMod 2 and if
    Redraw.Object display.world
  then
  then
;

: DoEditEvents
  0 0 0 locals| temp theIPC theMessage
  XEditExits @ if
    ascii YPJK 0 Get.Resource to theIPC
    theIPC if
      theIPC @ w@ 1 =
      theIPC @ 4+ W@ 1 = and
        theIPC ValidEditor and if          \ if whomto is us, and its for ..
        0 theIPC @ 4+ W!
```

-000732

```
      theIPC @ 8 + w@ to theMessage
      theMessage case
        1 of  theIPC @ 16 + @          \ the data
            theIPC @ 10 + w@          \ the mod
            theIPC @ 20 + @           \ the size
            CheckinObject
          endof

        2 of
             theIPC @ 16 + @
             Set.Current.Object
             CURRENT.HANDLE theIPC @ 16 + !      \ set data to current object
             CURRENT.SIZE theIPC @ 20 + !       \ set message length
             theIPC @ 2 + w@ theIPC @ w!      \ set sender as reciever
             1 theIPC @ 2 + w!          \ set swiv as the sender
             1 theIPC @ 4+ W!           \ set the message as sent
           endof

        4   of Current.Object @ theIPC @ 16 + !    \ set data to current object
             4 theIPC @ 20 + !            \ set message length
             theIPC @ 2 + w@ theIPC @ w!       \ set sender as reciever
             1 theIPC @ 2 + w!           \ set swiv as the sender
             1 theIPC @ 4+ W!            \ set the message as sent
          endof

        5   of theIPC @ 16 + @ Set.Current.Object endof

        6 of theIPC @ 20 + @ from.heap to temp
            temp if
              theIPC @ 16 + @ @
              temp @
              theIPC @ 20 + @ cmove
              temp lock.handle
              temp PARSE.TEXT.HANDLE
              temp unlock.handle
              temp to.heap
            then
          endof

        8   of  CLEAR.REDRAW
              RE.TOGGLE
              CLEAR.REDRAW
          endof

        9   of  RE.TOGGLE
            REDRAW
          endof

       endcase
     then
   then
 then
;

find DoEditEvents ' ^DoEditorEvents !

hex

code launchit
  a0 pop,
  a9f2 w,
  d0 push,
next end-code
```

-000733

T

```
: DoXEditor
   0 0 temp.string locals| launchblock theIPC theXEdit theEditor
  XEditExits @ if
    a 0 do
      ascii XEDT i Get.Resource to theXEdit
      theXEdit if
        theXEdit @ @ theEditor = if
          theXEdit launchblock dup pad Get.Res.Info
          Pad launchblock !
          0   launchblock 4 + w!
          ascii LC launchblock 6 + w!
          6 launchblock A + !
          C000 launchblock C + !
          0 launchblock 10 + !
          launchblock launchit drop
          ascii YPJK 0 Get.Resource to theIPC
          theIPC if
            theEditor theIPC @ w!           \ set the editor
            1 theIPC @ 2+ w!              \ from swive.
            1 theIPC @ 4 + W!              \ send
            3 theIPC @ 8 + W!              \ edit
            current.handle theIPC @ 10 + !        \ theData
            current.size theIPC @ 14 + !        \ theSize
          then
        then
      then
    loop
  then
;


find DoXEditor ' ^DoXEditor !



: HandleXEditorMenu
  0 0 0 temp.string locals| launchblock theEditor theIPC theXEdit theEditId
  XEditExits @ if
    ascii XEDT theEditId Get.Resource to theXEdit
    theXEdit if
      theXEdit @ @ to theEditor
      theXEdit launchblock dup pad Get.Res.Info
      Pad launchblock !
      0   launchblock 4 + w!
      ascii LC launchblock 6 + w!
      6 launchblock 8 + !
      C000 launchblock C + !
      0 launchblock 10 + !
      launchblock launchit drop
      ascii YPJK 0 Get.Resource to theIPC
      theIPC if
        theEditor theIPC @ w!           \ set the editor
        1 theIPC @ 2+ w!              \ from swive.
        1 theIPC @ 4 + W!              \ send
        3 theIPC @ 8 + W!              \ edit
        current.handle theIPC @ 10 + !        \ theData
        current.size theIPC @ 14 + !        \ theSize
      then
    then
  then
;
```

```
decimal

find HandleXEditorMenu ' ^HandleXEditorMenu !


: doBeforeBye                         \ tell editors we are dying
  0 locals| theIPC |
  XEditExits @ if
    ascii YPJK 0 Get.Resource to theIPC
    theIPC if
      -1 theIPC @ w!              \ all editors
      1 theIPC @ 2+ w!            \ from swivel
      1 theIPC @ 4 + W!            \ send
      7 theIPC @ 8 + W!            \ dying
      0 theIPC @ 10 + !            \ theData
      0 theIPC @ 14 + !           \ theSize
    then
  then
  last.bye @ execute
;

before.bye @ last.bye !
find doBeforeBye before.bye !
```

```
\ command words for swivel
\ sets up a special vocabulary of words for  swivel to execute
\ added menu words and comments
\ Last Revision: 09/23/88  09:56:14 AM   YH


 ANEW SWIV.PARSE1
cr ." Loading Command File Interpreter..."

\ ERROR HANDLING


GLOBAL PARSE.ERROR.FLAG
VARIABLE PARSE.COMMAND 255 ALLOT

global B.POINTER  \ parse globals
global E.POINTER
global T.HANDLE
global CURRENT.TEXT.LINE


2000 CONSTANT NOT.RECOGNIZED
2001 CONSTANT BAD.ARGS
2002 CONSTANT NO.BEGIN.COMMENT
2003 CONSTANT NO.END.COMMENT


 NEW.WINDOW PARSE.WIN
 " COMMAND"            PARSE.WIN  W.TITLE
 40 10 80 410          PARSE.WIN  W.BOUNDS
 2             PARSE.WIN  W.TYPE

  : HANDLE.COMMAND
    IF
      BEGIN
      DO.EVENTS MOUSE.DOWN = IF
        >DRAG.WINDOW
      THEN
      AGAIN
    ELSE
      PARSE.WIN CLOSE.WINDOW
    THEN ;


  : ShowWork
    PARSE.WIN ADD.WINDOW
    PARSE.WIN WINDOW
    4 TEXTFONT
    12 TEXTSIZE
    8 TEXTMODE
    PARSE.WIN ON.ACTIVATE HANDLE.COMMAND
    ;

  : HideWork
    PARSE.WIN ?ACTIVE.WPTR IF
      PARSE.WIN CLOSE.WINDOW
    THEN ;
```

-000736

```
  : OUTPUT.COMMAND.LINE
    PARSE.WIN ?ACTIVE.WPTR IF
      PARSE.WIN WINDOW
      PAGE
```

```
      ." Reading Line Number:  " CURREN..TEXT.LINE . CR
    THEN ;

  : OUTPUT.COMMAND.STRING
    LOCALS| THE.STRING :
    PARSE.WIN ?ACTIVE.WPTR IF
      PARSE.WIN WINDOW
      THE.STRING COUNT TYPE
      ."  "
    THEN ;

-12345  CONSTANT STACK.BOTTOM

  : ARGS
    1+ PICK
    STACK.BOTTOM = NOT IF
      BAD.ARGS TO PARSE.ERROR.FLAG
      0
    ELSE -1 THEN ;

  CODE GET.STACK
     SP PUSH, NEXT END-CODE

  CODE PUT.STACK
    SP POP, NEXT END-CODE

  : MOVE.STRING
    LOCALS: S1 S2 :
    S2  S1  S2 C@ 1+ CMOVE  ;

  : HANDLE.PARSE.ERROR
    0 LOCALS| STR.HANDLE
    PARSE.ERROR.FLAG inbackground @ not and IF
      TEMP.STRING 20 BLANKS
      CURRENT.TEXT.LINE TEMP.STRING #>S!
      "STR PARSE.ERROR.FLAG ABS
      GET.RESOURCE TO STR.HANDLE
      STR.HANDLE IF
        STR.HANDLE LOCK.HANDLE
        STR.HANDLE @
        PARSE.COMMAND
        "   On Line: "
        TEMP.STRING
        401 IssueAlert
        DROP
        0 TO PARSE.ERROR.FLAG
        STR.HANDLE UNLOCK.HANDLE
      THEN
    THEN ;

\ parsing primatives

  : ADVANCE.TILL.SPACE                  \ handle pointer -- advances pointer to a space
  0 LOCALS| C.CHAR C.POINTER T.HANDLE
    C.POINTER 1- TO C.POINTER
    BEGIN
      C.POINTER 1+ TO C.POINTER
      C.POINTER T.HANDLE @ + C@ TO C.CHAR
      C.CHAR 33 <
      T.HANDLE HANDLE.SIZE  1 - C.POINTER < OR
```

-000737

```
   UNTIL
   C.POINTER ;


 : ADVANCE.TILL.LETTER              \ handle pointer -- advances pointer to a letter
 0 LOCALS| C.CHAR C.POINTER T.HANDLE
   C.POINTER 1- TO C.POINTER
   BEGIN
     C.POINTER 1+ TO C.POINTER
     C.POINTER T.HANDLE @ + C@ TO C.CHAR
     C.CHAR 13 = IF
       CURRENT.TEXT.LINE 1+ TO CURRENT.TEXT.LINE
       OUTPUT.COMMAND.LINE
     THEN
     C.CHAR 32 >
     T.HANDLE HANDLE.SIZE 1 - C.POINTER < OR
   UNTIL
   C.POINTER ;

 : NEXT.WORD                    \ places word in pad -- bool for valid
   0 LOCALS| C.LENGTH
   PAD 64 BLANKS
   E.POINTER TO B.POINTER             \ set begining to end
   T.HANDLE B.POINTER
   ADVANCE.TILL.LETTER              \ advance to a letter
   TO B.POINTER                 \ store as beginning pointer
   B.POINTER TO E.POINTER
   T.HANDLE E.POINTER
   ADVANCE.TILL.SPACE               \ advance to a space
   TO E.POINTER                 \ store as end pointer
   B.POINTER T.HANDLE HANDLE.SIZE  <  IF      \ if beginning pointer is within size
     E.POINTER B.POINTER -            \ calc size of word
     255 MIN TO C.LENGTH             \ set to min of 255
     T.HANDLE @ B.POINTER +           \ start address of word
     PAD 1+ C.LENGTH CMOVE           \ move to pad
     C.LENGTH PAD C!
     -1
     PAD OUTPUT.COMMAND.STRING
   ELSE 0 THEN ;

\ numeric modes

  0 CONSTANT INTEGER.NUMERIC
  1 CONSTANT GRAPHIC.NUMERIC
  2 CONSTANT FIXED.NUMERIC
  3 CONSTANT MEASURE.NUMERIC
  4 CONSTANT ANGLE.NUMERIC

\ global var for numerics

  GLOBAL NUMERIC.MODE
  INTEGER.NUMERIC TO NUMERIC.MODE

\ words to change numeric mode

  : USE.FIXED FIXED.NUMERIC TO NUMERIC.MODE ;
  : USE.MEASURE MEASURE.NUMERIC TO NUMERIC.MODE ;
  : USE.INTEGER  INTEGER.NUMERIC TO NUMERIC.MODE ;
  : USE.GRAPHIC  GRAPHIC.NUMERIC TO NUMERIC.MODE ;
  : USE.ANGLE  ANGLE.NUMERIC TO NUMERIC.MODE ;

\ words to change positional measure used
```

-000738

```
: USE.PIXELS
  SCREEN.CONVERT OBJECT.MEASURE.TO.SCREEN PLACE
    1000 OBJECT.RULER.UNIT PLACE
  1000 OBJECT.SCALE.UNIT PLACE
    6 OBJECT.MEASURE.SCALE PLACE
  2 OBJECT.MEASURE.REF PLACE
     10 OBJECT.MEASURE.DIV PLACE
    SET.RULER.GLOBAL ;

: USE.CENTIMETERS
  CENTI.CONVERT OBJECT.MEASURE.TO.SCREEN PLACE
    1000 OBJECT.RULER.UNIT PLACE
  1000 OBJECT.SCALE.UNIT PLACE
    3 OBJECT.MEASURE.SCALE PLACE
  1 OBJECT.MEASURE.REF PLACE
     10 OBJECT.MEASURE.DIV PLACE
    SET.RULER.GLOBAL ;

: USE.INCHES
  INCH.CONVERT OBJECT.MEASURE.TO.SCREEN PLACE
    1000 OBJECT.RULER.UNIT PLACE
  1000 OBJECT.SCALE.UNIT PLACE
    0 OBJECT.MEASURE.SCALE PLACE
  0 OBJECT.MEASURE.REF PLACE
     10 OBJECT.MEASURE.DIV PLACE
    SET.RULER.GLOBAL ;


\ error constants for executable tokens

  2000 CONSTANT SIZEMESH.ERROR
  2001 CONSTANT MESHPOINT.ERROR
  2002 CONSTANT ENDMESH.ERROR

  CREATE "EndComment  ," )"

\ comment operators

  : Start.Comment
    BEGIN
      PAD 24 BLANKS
      NEXT.WORD IF
        Pad "EndComment -STRING 0=
      ELSE
        -1  NO.END.COMMENT TO PARSE.ERROR.FLAG
      THEN
    UNTIL ;

  : End.Comment
    NO.BEGIN.COMMENT TO PARSE.ERROR.FLAG ;


\ operators on current.object

  : MakeName
    PAD 24 BLANKS
    NEXT.WORD IF
      pad 1+ OBJECT.STRING EXT CMOVE
    ELSE
      BAD.ARGS TO PARSE.ERROR.FLAG
    THEN ;

  : FindObject
```

-000739

```
  0 LOCALS| F.OBJECT |
  PAD 24 BLANKS
  NEXT.WORD IF
    20 PAD C!
    FIND.OBJECT TO F.OBJECT
    F.OBJECT META.WORLD > IF
      F.OBJECT SET.CURRENT.OBJECT
      F.OBJECT CHANGED.FLAG !
    ELSE
      BAD.ARGS TO PARSE.ERROR.FLAG
    THEN
  ELSE
      BAD.ARGS TO PARSE.ERROR.FLAG
  THEN ;

GLOBAL TEMP.OPTION
GLOBAL TEMP.WINDOW
0 TO TEMP.WINDOW
0 TO TEMP.OPTION

: EnterPreview
  OPTION.BITS @ to TEMP.OPTION
  GET.WINDOW TO TEMP.WINDOW
  CLEAR.REDRAW RE.TOGGLE CLEAR.REDRAW
  OPTION.FAST.BIT OPTION.BITS !
  WORLD.OUTPUT ?ACTIVE.WPTR IF
    WORLD.OUTPUT +HBAR @ 0 0 SET.CONTROL.RANGE
    WORLD.OUTPUT +VBAR @ 0 0 SET.CONTROL.RANGE
    WORLD.OUTPUT BRING.TO.FRONT
    WORLD.OUTPUT WINDOW
    PAGE
    CLEAR.EDGE
    V.TOOL.WIDTH -1          \ display the bounds of the current backport
    ZBUFFERX @ V.TOOL.WIDTH - 1-
      ZBUFFERY @
    FRAME RECTANGLE
    HILITE.V.TOOL
  THEN ;


: ExitPreview
  TEMP.OPTION IF
    TEMP.OPTION OPTION.BITS !
  THEN
  TEMP.WINDOW  ?ACTIVE.WPTR IF
    TEMP.WINDOW WINDOW
    TEMP.WINDOW BRING.TO.FRONT
  THEN
  CLEAR.REDRAW RE.TOGGLE CLEAR.REDRAW
  0 TO TEMP.OPTION
  0 TO TEMP.WINDOW
  CURRENT.OBJECT @ >R
  WORLD.OBJECT SET.CURRENT.OBJECT
  REDRAW.OBJECT
  DISPLAY.WORLD.OUTPUT
  R> SET.CURRENT.OBJECT  ;


: DrawWorld
  OPTION.BITS @  OPTION.FAST.BIT AND IF
    CURRENT.OBJECT @ >R
    WORLD.OBJECT SET.CURRENT.OBJECT
    SET.ABSOLUTE
    DISPLAY.WORLD.CURSOR
```

-000740

```
    -1 DRAW.CHECK !
    R> SET.CURRENT.OBJECT
  ELSE
    WORLD.OBJECT SET.CURRENT.OBJECT
    GET.OBJECT
    REDRAW.OBJECT
    DISPLAY.WORLD.OUTPUT
  THEN ;

: EffectsRender
  OPTION.BITS @  OPTION.FAST.BIT AND IF
    CURRENT.OBJECT @ >R
    WORLD.OBJECT SET.CURRENT.OBJECT
    SET.ABSOLUTE
    DISPLAY.WORLD.CURSOR
    -1 DRAW.CHECK !
    R> SET.CURRENT.OBJECT
  ELSE
    DO.EFFECTS.COMMAND
  THEN ;


: DrawObject
  OPTION.BITS @  OPTION.FAST.BIT AND IF
    CURRENT.OBJECT @ >R
    WORLD.OBJECT SET.CURRENT.OBJECT
    SET.ABSOLUTE
    DISPLAY.WORLD.CURSOR
    -1 DRAW.CHECK !
    R> SET.CURRENT.OBJECT
  ELSE
    GET.OBJECT
    REDRAW.OBJECT
    DISPLAY.WORLD.OUTPUT
  THEN ;

: LinkTo
  CURRENT.OBJECT @
  0 LOCALS| PARENT.OBJECT CHILD.OBJECT
  FINDOBJECT
  PARSE.ERROR.FLAG NOT IF
    ALL.FREE GLOBAL.LINK W!
    CURRENT.OBJECT @ TO PARENT.OBJECT
    GET.WINDOW >R
    WORLD.OUTPUT WINDOW
    PARENT.OBJECT CHILD.OBJECT MAKE.LINK
    R> WINDOW
  THEN ;

: LockX  LINK.TYPE PLUCK X.LOCK OR LINK.TYPE PLACE ;
: LockY  LINK.TYPE PLUCK Y.LOCK OR LINK.TYPE PLACE ;
: LockZ  LINK.TYPE PLUCK Z.LOCK OR LINK.TYPE PLACE ;

: LockYaw  LINK.TYPE PLUCK Yaw.LOCK OR LINK.TYPE PLACE ;
: LockPitch  LINK.TYPE PLUCK Pitch.LOCK OR LINK.TYPE PLACE ;
: LockRoll LINK.TYPE PLUCK Roll.LOCK OR LINK.TYPE PLACE ;


GLOBAL Set.Token
0 to Set.Token


: (SetRGB)  3 ARGS IF
     color.scale 1000 */ 0 MAX COLOR.SCALE MIN ROT
```

-000741

```
        color.scale 1000 */ 0 MAX COLOR.SCALE MIN ROT
        color.scale 1000 */ 0 MAX COLOR.SCALE MIN ROT
        Object.RGBColor drop !RGB
        ELSE
          " SetRGB:" PARSE.COMMAND MOVE.STRING
        THEN
        0 to Set.Token
        USE.INTEGER ;


  : (RelPos)  3 ARGS IF
          NEG OBJECT.R3POS PLACE
        ELSE
          " RelPos:" PARSE.COMMAND MOVE.STRING
        THEN
        0 to Set.Token
        USE.INTEGER ;

  : (AbsPos)  3 ARGS IF
          NEG OBJECT.A3POS PLACE
          Set.Relative
        ELSE
          " AbsPos:" PARSE.COMMAND MOVE.STRING
        THEN 0 to Set.Token
        USE.INTEGER ;

  : (RelAtt)  3 ARGS IF
          YAW PITCH ROL
          COSINES OBJECT.RCOS MOVE.RECORD
        ELSE
          " RelAtt:" PARSE.COMMAND MOVE.STRING
        THEN 0 to Set.Token
        USE.INTEGER ;

  : (AbsAtt)  3 ARGS IF
          YAW PITCH ROL
          COSINES OBJECT.ACOS MOVE.RECORD
          Set.Relative
        ELSE
          " AbsAtt:" PARSE.COMMAND MOVE.STRING
        THEN 0 to Set.Token
        USE.INTEGER ;

  : (RelScale) 1 args if
          PERCENTAGE> OBJECT.RSCALE PLACE
        ELSE
          " RelScale:" PARSE.COMMAND MOVE.STRING
        then 0 to Set.Token
        USE.INTEGER ;

  : (AbsScale) 1 args if
          PERCENTAGE> OBJECT.SCALE PLACE
          Set.Relative
         ELSE
          " AbsScale:" PARSE.COMMAND MOVE.STRING
         then 0 to Set.Token
        USE.INTEGER ;
```

-000742

```
  : (XRange)
    2 Args if
      X.RANGE PLACE
    ELSE
```

```
    " XRange:" PARSE.COMMAND MOVE.STRING
  then
  0 to Set.Token
  USE.INTEGER ;

: (YRange)
  2 Args if
    Y.RANGE PLACE
  ELSE
    " YRange:" PARSE.COMMAND MOVE.STRING
  then
  0 to Set.Token
  USE.INTEGER ;

: (ZRange)
  2 Args if
    neg swap neg Z.RANGE PLACE
  ELSE
    " ZRange:" PARSE.COMMAND MOVE.STRING
  then
  0 to Set.Token
  USE.INTEGER ;

: (YawRange)
  2 Args if
    Yaw.RANGE PLACE
  ELSE
    " YawRange:" PARSE.COMMAND MOVE.STRING
  then
  0 to Set.Token
  USE.INTEGER ;

: (PitchRange)
  2 Args if
    Pitch.RANGE PLACE
  ELSE
    " PitchRange:" PARSE.COMMAND MOVE.STRING
  then
  0 to Set.Token
  USE.INTEGER ;

: (RollRange)
  2 Args if
    Rol.RANGE PLACE
  ELSE
    " RollRange:" PARSE.COMMAND MOVE.STRING
  then
  0 to Set.Token
  USE.INTEGER ;


  : SetRGB  Token.for (SetRGB) TO SET.TOKEN USE.MEASURE ;
: RelPos: Token.for (RelPos) TO SET.TOKEN USE.FIXED ;
: AbsPos: Token.for (AbsPos) TO SET.TOKEN USE.FIXED ;

: RelAtt: Token.for (RelAtt) TO SET.TOKEN USE.ANGLE ;
: AbsAtt: Token.for (AbsAtt) TO SET.TOKEN USE.ANGLE ;

: RelScale: Token.for (RelScale) TO SET.TOKEN USE.MEASURE ;
: AbsScale: Token.for (AbsScale) TO SET.TOKEN USE.MEASURE ;

: XRange: Token.for (XRange) TO SET.TOKEN USE.FIXED ;
: YRange: Token.for (YRange) TO SET.TOKEN USE.FIXED ;
: ZRange: Token.for (ZRange) TO SET.TOKEN USE.FIXED ;
```

```
: YawRange:   Token.for (YawRange) TO SET.TOKEN USE.ANGLE ;
: PitchRange: Token.for (PitchRange) TO SET.TOKEN USE.ANGLE ;
: RollRange:  Token.for (RollRange) TO SET.TOKEN USE.ANGLE ;


: SetIt
  SET.TOKEN IF
    SET.TOKEN EXECUTE
  ELSE
    BAD.ARGS TO PARSE.ERROR.FLAG
    USE.INTEGER
  THEN  ;


\ words to define mesh.objects

 : BeginMesh                       \ -- form, count ...starts description of mesh.form
   -1 -1 -1
   MESH.FORM  0
   INTEGER.NUMERIC TO NUMERIC.MODE
    ;

 : SizeMesh                        \ form count #polys #points --- form count
   LOCALS| #POLYS #POINTS ZED THE.FORM          \ defines size of mesh array
   THE.FORM MESH.FORM = IF                 \ if the form is a mesh form
     #POLYS MAX.TYPE.POINTS 10 - MIN AllPoints !       \ define the size and store in AllPoints
     #POINTS MAX.TYPE.POINTS 10 - MIN AllPoints 4- !
     THE.FORM  #POLYS #POINTS * 0
     FIXED.NUMERIC TO NUMERIC.MODE             \ change numeric mode to fixed
   ELSE
     BAD.ARGS TO PARSE.ERROR.FLAG              \ else post the error
   THEN ;

 : MeshPoint
   LOCALS| MZ MY MX THE.POINTER THE.COUNT THE.FORM     \ form count pointer z y x -- form count
   THE.FORM MESH.FORM = NOT IF              \ defines a point and stores in AllPoints
     BAD.ARGS TO PARSE.ERROR.FLAG              \ post error if wrong form, or type [illegible]
   ELSE
     THE.POINTER THE.COUNT > IF             \ if the count is out of range
       BAD.ARGS TO PARSE.ERROR.FLAG            \ post error
     ELSE
       MX MY MZ                  \ else store the point
       AllPoints 8+
       THE.POINTER 3POINT.LENGTH * +
       FROM.STACK
       THE.POINTER 1+ TO THE.POINTER
     THEN
   THEN
   THE.FORM THE.COUNT THE.POINTER  ;               \ leave form, count [illegible]


 : MeshPoints:
   Token.for MeshPoint TO SET.TOKEN USE.FIXED ;


 : EndMesh                       \ form count pointer -- ends def of mesh.form
   LOCALS| THE.POINTER THE.COUNT THE.FORM
   THE.FORM MESH.FORM = NOT IF
     BAD.ARGS TO PARSE.ERROR.FLAG               \ if mismatch post error
   ELSE
     THE.POINTER THE.COUNT - NOT IF
       BAD.ARGS TO PARSE.ERROR.FLAG
     ELSE
```

```
       DROP 2DROP                    \ take off padding on stack
       NEW.OBJECT                    \ make a new object
       PUT.MESH                     \ put the mesh in it
       CULL.BACK.BIT                   \ no backplane cull
       TRIANGLE.MESH.BIT +                \ use triangle mesh
       OBJECT.FORM.RENDER PLACE             \ set attributes
       0 YAW 0 PITCH 0 ROL                \ set it to side view
       COSINES OBJECT.ACOS MOVE.RECORD          \ store the orientation
       SET.RELATIVE                  \ set relative position
       DRAW.OBJECT                   \ draw the object
       DISPLAY.WORLD.OUTPUT              \ display to the world window
     THEN
   THEN
   INTEGER.NUMERIC TO NUMERIC.MODE           \ set numeric mode back to integer
   0 TO SET.TOKEN
   ;


\ Path Object Commands

: BeginPathObject
  NEW.OBJECT
  GET.CONTOURS
  USE.GRAPHIC ;

: EndPathObject
  PUT.CONTOURS
  SET.RELATIVE
  GET.OBJECT
  REDRAW.OBJECT
  INTEGER.NUMERIC TO NUMERIC.MODE          \ set numeric mode back to integer
  0 TO SET.TOKEN ;


: NewPath
  4 CURRENT.CPOINT !
  4 CURRENT.POINT !
   ;

: CrossPoint
  2 ARGS IF
    this.cpoint!
    current.cpoint @ CCONTOUR !
    INC.CURRENT.CPOINT
  THEN ;

: CrossPoints:
  4 CURRENT.CPOINT !
  4 CURRENT.POINT !
  Token.for CrossPoint TO SET.TOKEN USE.GRAPHIC ;


: LathePoint                \ writes all sides
  2 ARGS IF
    WRITE.CONTOUR              \ write current position to array
        CURRENT.POINT @  CONTOUR !       \ update index for array
    INC.CURRENT.POINT
  THEN ;

: LathePoints:
  4 CURRENT.CPOINT !
  4 CURRENT.POINT !
  Token.for LathePoint TO SET.TOKEN USE.GRAPHIC ;
```

-000745

```
: SidePoint
  2 ARGS IF
    CURRENT.POINT @ CONTOUR @ 1- <  IF
      0 TOP !
      -1 SIDE !
      -1 SYMETRY !
      UPSIDE SIDER !
      WRITE.CONDITIONAL
      INC.CURRENT.POINT
    THEN
  THEN ;

: SidePoints:
  4 CURRENT.CPOINT !
  4 CURRENT.POINT !
  Token.for SidePoint TO SET.TOKEN USE.GRAPHIC ;


: DownSidePoint
  2 ARGS IF
    CURRENT.POINT @ CONTOUR @ 1- <  IF
      0 TOP !
      -1 SIDE !
      0 SYMETRY !
      DOWNSIDE SIDER !
      WRITE.CONDITIONAL
      INC.CURRENT.POINT
    THEN
  THEN ;

: DownSidePoints:
  4 CURRENT.CPOINT !
  4 CURRENT.POINT !
  Token.for DownSidePoint TO SET.TOKEN USE.GRAPHIC ;


: TopPoint
  2 ARGS IF
    CURRENT.POINT @ CONTOUR @ 1- <  IF
      -1 TOP !
      0 SIDE !
      -1 SYMETRY !
      DOWNTOP SIDER !
      WRITE.CONDITIONAL
      INC.CURRENT.POINT
    THEN
  THEN ;

: TopPoints:
  4 CURRENT.CPOINT !
  4 CURRENT.POINT !
  Token.for TopPoint TO SET.TOKEN USE.GRAPHIC ;


: FrontTopPoint
  2 ARGS IF
    CURRENT.POINT @ CONTOUR @ 1- <  IF
      -1 TOP !
      0 SIDE !
      0 SYMETRY !
      UPTOP SIDER !
      WRITE.CONDITIONAL
      INC.CURRENT.POINT
    THEN
```

-000746

```
  THEN ;

: FrontTopPoints:
  4 CURRENT.CPOINT !
  4 CURRENT.POINT !
  Token.for FrontTopPoint TO SET.TOKEN USE.GRAPHIC ;


\ poly.form render commands


: PolyPoints
  3 args if
    SHADE.POINTS #POLY.POINTS @ 12 * -
    FROM.STACK
    #POLY.POINTS @ 1+
    MAX.TYPE.POINTS MIN
    #POLY.POINTS !
  ELSE
    " PolyPoints:" PARSE.COMMAND MOVE.STRING
  THEN ;


: PolyPoints:
  0 #POLY.POINTS !
  Token.for PolyPoints TO SET.TOKEN
  USE.FIXED ;


: ADD.POLY.POINTS
  0 LOCALS| OLD.SIZE |
  CURRENT.OBJECT @ WORLD.OBJECT - NOT IF
  OBJECT.FORM PLUCK POLY.FORM = NOT IF
    POLY.FORM OBJECT.FORM PLACE
    ' OBJECT.TYPE @ 2+
    RESIZE.RES.RECORD IF
       0 OBJECT.TYPE DROP W!
    ELSE
      -108 TO ERROR.FLAG
    THEN
  THEN
  ERROR.FLAG 0= IF
    CURRENT.HANDLE HANDLE.SIZE TO OLD.SIZE
    #POLY.POINTS @ 12 * 2+ OLD.SIZE -
    RESIZE.RES.RECORD IF
      #POLY.POINTS @
      CURRENT.HANDLE @ OLD.SIZE - 2- W!
      SHADE.POINTS
      CURRENT.HANDLE @ OLD.SIZE -
      #POLY.POINTS @ 12 * CMOVE
      0 CURRENT.HANDLE @
      CURRENT.HANDLE HANDLE.SIZE - 2- W!
    ELSE
      -108 TO ERROR.FLAG
    THEN
  THEN
  THEN ;


: EndPoly
  ADD.POLY.POINTS
  CULL.BACK.BIT                         \ no backplane cull
  OBJECT.FORM.RENDER PLACE                \ set attributes
```

-000747

```
  INTEGER.NUMERIC TO NUMERIC.MODE          \ set numeric mode back to integer
  0 TO SET.TOKEN
  ;


\ polynormal.form rendering


\ polynormal.form render commands


: PolyNormalPoints
  6 args if
    SHADE.POINTS #POLY.POINTS @ 12 * +
    FROM.STACK
    NORMALIZE
    POLY.POINTS #POLY.POINTS @ 12 * +
    FROM.STACK
    #POLY.POINTS @ 1+
    MAX.TYPE.POINTS MIN
    #POLY.POINTS !
  ELSE
    " PolyNormalPoints:" PARSE.COMMAND MOVE.STRING
  THEN ;


: PolyNormalPoints:
  0 #POLY.POINTS !
  Token.for PolyNormalPoints TO SET.TOKEN
  USE.FIXED ;


: ADD.POLYNORMAL.POINTS
  0 LOCALS| OLD.SIZE |
  CURRENT.OBJECT @ WORLD.OBJECT - NOT IF
  OBJECT.FORM PLUCK POLYNORMAL.FORM - NOT IF
    ' OBJECT.TYPE @ 2+
    RESIZE.RES.RECORD IF
       0 OBJECT.TYPE DROP W!
       POLYNORMAL.FORM OBJECT.FORM PLACE
    ELSE
      -108 TO ERROR.FLAG
    THEN
  THEN
  ERROR.FLAG 0= IF
    CURRENT.HANDLE HANDLE.SIZE TO OLD.SIZE
    #POLY.POINTS @ 24 * 2+ OLD.SIZE +
    RESIZE.RES.RECORD IF
      #POLY.POINTS @
      CURRENT.HANDLE @ OLD.SIZE + 2- W!
      SHADE.POINTS                        \ move in shade points
      CURRENT.HANDLE @ OLD.SIZE +
      #POLY.POINTS @ 12 * CMOVE
      POLY.POINTS                         \ move in normal points
      CURRENT.HANDLE @ OLD.SIZE + #POLY.POINTS @ 12 * +
      #POLY.POINTS @ 12 * CMOVE
      0 CURRENT.HANDLE @
      CURRENT.HANDLE HANDLE.SIZE + 2- W!          \ zero to mark end
    ELSE
      -108 TO ERROR.FLAG
    THEN
  THEN
  THEN ;
```

-000748

I

```
: EndPolyNormal
  ADD.POLYNORMAL.POINTS
  CULL.BACK.BIT                          \ no backplane cull
  OBJECT.FORM.RENDER PLACE                  \ set attributes
  INTEGER.NUMERIC TO NUMERIC.MODE              \ set numeric mode back to integer
  0 TO SET.TOKEN
  ;



  0 constant no.options


  : SetTweenOption
    0 locals| the.option |
    1 args if
      to the.option
      the.option 0= if
        0 OPTION.BITS !
      else
        OPTION.BITS @
        the.option or
        OPTION.BITS !
      then
    ELSE
      BAD.ARGS TO PARSE.ERROR.FLAG             \ else post the error
    THEN ;

  : SetRenderOption
    0 locals| the.option
    1 args if
      to the.option
      the.option 0= if
        0 EFFECT.BITS !
      else
        EFFECT.BITS @
        the.option or
        EFFECT.BITS !
      then
    ELSE
      BAD.ARGS TO PARSE.ERROR.FLAG             \ else post the error
    THEN ;


  : SetFrames
    1 ARGS IF
      Tween.count !
    ELSE
      BAD.ARGS TO PARSE.ERROR.FLAG             \ else post the error
    THEN ;

  : SetCount
    1 ARGS IF
      Tween.factor !
    ELSE
      BAD.ARGS TO PARSE.ERROR.FLAG             \ else post the error
    THEN ;

  : KeyFrame
    1 args if
      0 max key.max min
      set.current.key
```

-000749

```
  then ;

: KeyCount
  1 args if
    1 max key.max min
    KEY.COUNT !
  then ;

: LoopOn
  LOOP.TWEEN? ON ;

: LoopOff
  LOOP.TWEEN? OFF ;

: COMMAND.CLOSE
  (CLOSE.WORLD)
   MENU.OFF.TOKEN EXECUTE ;

: COMMAND.SAVEAS
  0 LOCALS| PUT.RES.ID
  PAD 64 BLANKS
  NEXT.WORD IF
    PAD DUP C@ 1+
    CURRENT.FILE.NAME SWAP CMOVE               \ save file name to global
    CLEAR.MOVING
    UPDATE.RESOURCES                       \ update changes to the file
    DETACH.RECORDS                         \ detach the rsource from its handle
    CLOSE.SCRATCH.FILE
    NEW.WORLD.FILE TO PUT.RES.ID
    PUT.RES.ID IF
      SET.OUTPUT.TITLE
      ATTACH.RECORDS                       \ attach the records to the new file
      UPDATE.RESOURCES                     \ save to new file
      DETACH.RECORDS                       \ detach these records again
      PUT.RES.ID CLOSE.RES.FILE                 \ close the new file
    THEN
    OPEN.SCRATCH.FILE                        \ open new scratch file
    ATTACH.RECORDS                         \ attach the records
  ERROR.FLAG TO PARSE.ERROR.FLAG
  ELSE
    BAD.ARGS TO PARSE.ERROR.FLAG
  THEN ;

: COMMAND.OPEN
  0 LOCALS! GET.ID
  PAD 64 BLANKS
  NEXT.WORD IF
   NEXT.OUTPUT.WINDOW IF
  CLEAR.SCRATCH.FILE                   \ if there is a window
  PAD DUP C@ 1+
    CURRENT.FILE.NAME SWAP CMOVE
    CURRENT.FILE.NAME C@ 0 = NOT IF          \ if not a nil file name
    ^?CLOSE.LAST.WINDOW EXECUTE          \ close the last window?
      SCRATCH.REF# @ dup
    RES.FILE.REF# ! VOLREF# !            \ set to one shots
    IODIR OFF
    0 RES.FILE.REF# @ SETVOL
    CURRENT.FILE.NAME                  \ open the file
    OPEN.RES.FILE TO GET.ID              \ store id in get.id
    GET.ID -1 = NOT IF                 \ if no error...
      Get.All.Records                 \ load the records
      ERROR.FLAG IF
        GET.ID CLOSE.RES.FILE            \ if error during load..
```

-000750

```
        ELSE
          GET.ID CLOSE.RES.FILE          \ detach the records and close the file
          NEW.SCRATCH.FILE
          PUT.NEW.SCRATCH
          TEMP.CLOSE.SCRATCH.FILE
          NEW.WINDOW.TOKEN @ EXECUTE
          SET.VIEW.LIMITS
          SCRATCH.TOKEN @ EXECUTE
          SET.OUTPUT.TITLE           \ set poly drawing and line drawing clip vars
          ZBUFFER.EXISTS?
            0 ?HEAP.SIZE MINHEAPSIZE <
            OR IF
            SET.START.BACKPORTS
          THEN
          WORLD.OBJECT
          SET.CURRENT.OBJECT          \ set the world as current
          REDRAW.OBJECT              \ draw the world
          DISPLAY.WORLD              \ display the world
          HILITE.V.TOOL             \ display the tools
        THEN
      THEN
    THEN
  THEN
  ELSE
    BAD.ARGS TO PARSE.ERROR.FLAG
  THEN ;

: COMMAND.NEW
  0 LOCALS| GET.ID |
   NEXT.OUTPUT.WINDOW IF            \ if there is a window
    NEW.WINDOW.TOKEN @ EXECUTE
    0 CURRENT.FILE.NAME !
    CLEAR.SCRATCH.FILE
    SET.VIEW.LIMITS
    SCRATCH.TOKEN @ EXECUTE           \ init the color
    ZBUFFER.EXISTS?
      0 ?HEAP.SIZE MINHEAPSIZE <
      OR IF
      SET.START.BACKPORTS
    THEN
    WORLD.OBJECT
    SET.CURRENT.OBJECT               \ set the world as current
    REDRAW.OBJECT                   \ draw the world
    DISPLAY.WORLD                   \ display the world
    HILITE.V.TOOL                  \ display the tools
  THEN   ;

: ObjectView
  CURRENT.OBJECT @                \ get current object
  LOCALS| C.OBJECT |
  SET.OBJECTS.VIEWPOINT
  OBJECT.STATE PLUCK UNUSED > IF          \ if an active little object ...
    WORLD.OBJECT SET.CURRENT.OBJECT
    REDRAW.OBJECT
    DISPLAY.WORLD.OUTPUT
  THEN
  C.OBJECT SET.CURRENT.OBJECT ;

 : (SetViewDistance)                \ fixed... sets view dist.
  1 ARGS if
   DUP DISTANCE !
```

-000751

```
      FIX.SCALE NEG SCALE DISTINCT
    SET.DEFAULT.CLIP.PLANE
  ELSE
    " ViewDistance:" PARSE.COMMAND MOVE.STRING
  then
  0 to Set.Token
  USE.INTEGER  ;

 : ViewDistance:
  Token.for (SetViewDistance) TO SET.TOKEN
  USE.FIXED ;

 : (SetHitherPlane)                  \ fixed... sets view dist.
  1 ARGS if
    SET.HITHER.PLANE
  ELSE
    " HitherPlane:" PARSE.COMMAND MOVE.STRING
  then
  0 to Set.Token
  USE.INTEGER  ;

 : HitherPlane:
  Token.for (SetHitherPlane) TO SET.TOKEN
  USE.FIXED ;

 : (SetYonPlane)                     \ fixed... sets view dist.
  1 ARGS if
    SET.YON.PLANE
  ELSE
    " YonPlane:" PARSE.COMMAND MOVE.STRING
  then
  0 to Set.Token
  USE.INTEGER .;

 : YonPlane:
  Token.for (SetYonPlane) TO SET.TOKEN
  USE.FIXED ;

 : remap.the.color
  ENTER.WORLD.RGB
  Convert2Materials
  INIT.WINDOW.PALETTE
  SET.WORLD.PALETTE.INDEX ;

\ define swivel executable vocabulary

 GLOBAL SWIVEL.ENTRIES
 0 TO SWIVEL.ENTRIES

 : Add.Token W, SWIVEL.ENTRIES 1+ TO SWIVEL.ENTRIES ;

 : Current@  Current.object @ ;

 CREATE SWIVEL.VOCAB
 \ fast vocab
    ," NULL"         NULL.TOKEN          Add.Token
    ," ,"        TOKEN.FOR SetIt       Add.Token
    ," Execute"      TOKEN.FOR EXECUTE       Add.Token
    ," RelPos:"      TOKEN.FOR RelPos:       Add.Token
    ," RelAtt:"      TOKEN.FOR RelAtt:       Add.Token
    ," RelScale:"    TOKEN.FOR RelScale:     Add.Token
    ," AbsPos:"      TOKEN.FOR AbsPos:       Add.Token
    ," AbsAtt:"      TOKEN.FOR AbsAtt:       Add.Token
    ," AbsScale:"    TOKEN.FOR AbsScale:     Add.Token
```

-000752

```
    ," FindObject"     TOKEN.FOR FindObject      Add.Token
    ," DrawWorld"      TOKEN.FOR DrawWorld       Add.Token
    ," EffectsRender"  TOKEN.FOR EffectsRender   Add.Token
    ," DrawObject"     TOKEN.FOR DrawObject      Add.Token
    ," ("          TOKEN.FOR Start.Comment   Add.Token
    ," )"          TOKEN.FOR End.Comment     Add.Token

\ hidden
    ," SetCurrent"     TOKEN.FOR Set.Current.Object Add.Token
    ," CurrentObject"  TOKEN.FOR Current@       Add.Token

\ clipboard
    ," Cut"        TOKEN.FOR DO.WORLD.CUT     Add.Token
    ," Paste"        TOKEN.FOR DO.WORLD.PASTE  Add.Token
    ," Copy"       TOKEN.FOR DO.WORLD.COPY   Add.Token
    ," Clear"        TOKEN.FOR DO.WORLD.CLEAR  Add.Token
      ," Duplicate"      TOKEN.FOR DUP.TREE       Add.Token

\ object attributes
    ," MakeName"       TOKEN.FOR MakeName       Add.Token
    ," XRange:"      TOKEN.FOR XRange:        Add.Token
    ," YRange:"      TOKEN.FOR YRange:        Add.Token
    ," ZRange:"      TOKEN.FOR ZRange:        Add.Token
    ," SetRelative"    TOKEN.FOR Set.Relative     Add.Token
    ," SetAbsolute"    TOKEN.FOR Set.Absolute     Add.Token
    ," LinkTo"       TOKEN.FOR LinkTo       Add.Token
    ," YawRange:"      TOKEN.FOR YawRange:      Add.Token
    ," PitchRange:"    TOKEN.FOR PitchRange:      Add.Token
    ," RollRange:"     TOKEN.FOR RollRange:     Add.Token
    ," LockX"        TOKEN.FOR LockX        Add.Token
    ," LockY"      TOKEN.FOR LockY        Add.Token
    ," LockZ"      TOKEN.FOR LockZ        Add.Token
    ," LockYaw"      TOKEN.FOR LockYaw        Add.Token
    ," LockPitch"    TOKEN.FOR LockPitch      Add.Token
    ," LockRoll"     TOKEN.FOR LockRoll       Add.Token
    ," SetRGB:"      TOKEN.FOR SetRGB       Add.Token
    ," RemapColor"     TOKEN.FOR remap.the.color Add.Token

\ object creation
    ," NewObject"      TOKEN.FOR New.Object      Add.Token
    ," BeginMesh"      TOKEN.FOR BeginMesh       Add.Token
    ," SizeMesh"       TOKEN.FOR SizeMesh        Add.Token
    ," MeshPoints:"    TOKEN.FOR MeshPoints:       Add.Token
    ," EndMesh"        TOKEN.FOR EndMesh         Add.Token
    ," BeginPathObject" TOKEN.FOR BeginPathObject    Add.Token
    ," EndPathObject"   TOKEN.FOR EndPathObject    Add.Token
    ," NewPath"        TOKEN.FOR NewPath         Add.Token
    ," CrossPoints:"   TOKEN.FOR CrossPoints:      Add.Token
    ," LathePoints:"   TOKEN.FOR LathePoints:      Add.Token
    ," SidePoints:"    TOKEN.FOR SidePoints:       Add.Token
    ," DownSidePoints:" TOKEN.FOR DownSidePoints:    Add.Token
    ," TopPoints:"     TOKEN.FOR TopPoints:      Add.Token
    ," FrontTopPoints:" TOKEN.FOR FrontTopPoints:    Add.Token
    ," PolyPoints:"    TOKEN.FOR PolyPoints:     Add.Token
    ," EndPoly"      TOKEN.FOR EndPoly        Add.Token
    ," PolyNormPoints:" TOKEN.FOR PolyNormalPoints: Add.Token
    ," EndPolyNorm"    TOKEN.FOR EndPolyNormal    Add.Token

\ rendering
    ," ViewDistance:" TOKEN.FOR ViewDistance:    Add.Token
    ," HitherPlane:"  TOKEN.FOR HitherPlane:     Add.Token
    ," YonPlane:"   TOKEN.FOR YonPlane:      Add.Token
    ," ObjectView"       TOKEN.FOR ObjectView     Add.Token
```

-000753

```
,"  ObjectEdge"     TOKEN.FOR EDGE.OBJECTS     Add.Token
,"  DepthEdge"      TOKEN.FOR EDGE.ENHANCE     Add.Token
,"  Shadow"         TOKEN.FOR Shade.pix     Add.Token
,"  ProjectImage"   TOKEN.FOR map.shadow.pix   Add.Token
,"  WritePicture"   TOKEN.FOR WriteOutput      Add.Token
,"  InitPics"    TOKEN.FOR InitPics      Add.Token
,"  WritePics"      TOKEN.FOR WRITE.PICS.FRAME  Add.Token
,"  InitScrap"   TOKEN.FOR InitZSYS      Add.Token
,"  WriteScrap"     TOKEN.FOR WRITE.ZSYS.FRAME  Add.Token
,"  SetRenderOption" TOKEN.FOR SetRenderOption   Add.Token
,"  NoOptions"      TOKEN.FOR no.options     Add.Token
,"  EdgeOption"     TOKEN.FOR OPTION.edge.BIT   Add.Token
,"  ShadowOption"   TOKEN.FOR OPTION.SHADOW.BIT Add.Token
,"  ProjectOption"    TOKEN.FOR OPTION.PROJECT.BIT Add.Token
,"  AliasOption"    TOKEN.FOR OPTION.ALIAS.BIT  Add.Token
,"  EnterPreview"   TOKEN.FOR EnterPreview    Add.Token
,"  ExitPreview"    TOKEN.FOR ExitPreview    Add.Token


\ Tweening
,"  SetTweenOption"  TOKEN.FOR SetTweenOption  Add.Token
,"  PaintOption"    TOKEN.FOR OPTION.PAINT.BIT   Add.Token
,"  ViewOption"     TOKEN.FOR OPTION.VIEW.BIT    Add.Token
,"  FastOption"     TOKEN.FOR OPTION.FAST.BIT    Add.Token
,"  ScrapOption"    TOKEN.FOR OPTION.SCRAP.BIT   Add.Token
,"  DepthOption"    TOKEN.FOR OPTION.EEDGE.BIT   Add.Token
,"  PictOption"     TOKEN.FOR OPTION.PROPICT.BIT Add.Token
,"  SetFrames"      TOKEN.FOR SetFrames     Add.Token
,"  SetCount"    TOKEN.FOR SetCount      Add.Token
,"  KeyFrame"    TOKEN.FOR KEYFRAME      Add.Token
,"  KeyCount"    TOKEN.FOR KEYCOUNT      Add.Token
,"  TweenStart"     TOKEN.FOR SET.KEY.FRAME    Add.Token
,"  TweenEnd"    TOKEN.FOR ADD.KEY.FRAME    Add.Token
,"  SetKeyFrame"    TOKEN.FOR Set.Key.Frame    Add.Token
,"  AddKeyFrame"    TOKEN.FOR Add.Key.Frame    Add.Token
,"  LoopOn"      TOKEN.FOR LoopOn       Add.Token
,"  LoopOff"     TOKEN.FOR LoopOff      Add.Token
,"  Tween"    TOKEN.FOR DO.TWEENING      Add.Token

\ Parsing
,"  ShowWork"    TOKEN.FOR ShowWork       Add.Token
,"  HideWork"    TOKEN.FOR HideWork       Add.Token
,"  FIXED"       TOKEN.FOR USE.FIXED      Add.Token
,"  INTEGER"     TOKEN.FOR USE.INTEGER      Add.Token
,"  GRAPHIC"     TOKEN.FOR USE.GRAPHIC      Add.Token
,"  UsePixels"      TOKEN.FOR USE.PIXELS     Add.Token
,"  UseCenti"    Token.for USE.CENTIMETERS    Add.Token
,"  UseInches"      Token.for Use.Inches     Add.Token

\ File
,"  CloseWorld"     TOKEN.FOR COMMAND.CLOSE    Add.Token
,"  SaveWorld"   TOKEN.FOR SAVE.WORLD     Add.Token
,"  SaveAsWorld"    TOKEN.FOR COMMAND.SAVEAS  Add.Token
,"  NewWorld"    TOKEN.FOR COMMAND.NEW      Add.Token
,"  OpenWorld"      TOKEN.FOR COMMAND.OPEN     Add.Token
,"  Quit"     TOKEN.FOR EXIT.WORLD    Add.Token


: LEGAL.NUMERIC?                        \ test numeric string for legality
-1 0 LOCALS| N.CHAR  T.FLAG N.STRING
  N.STRING C@ 0 DO                     \ loop through the string
    I N.STRING + C@ TO N.CHAR             \ get the current char
    N.CHAR 47 >                        \ if within number range
```

-000754

```
    N.CHAR 58 < AND
    N.CHAR 33 < OR              \ or a control charater
    N.CHAR ASCII . = OR          \ or a decimal point, ok
    N.CHAR ASCII - = OR          \ or a minus sign ok
    NOT IF 0 TO T.FLAG THEN       \ if none of these set flag to zero
  LOOP
  T.FLAG ;                   \ output the flag


: PARSE.NUMERIC                 \ parses numeric input string
  LOCALS| N.STRING |
  N.STRING LEGAL.NUMERIC? IF          \ if a legal numeric
  NUMERIC.MODE CASE              \ parse using proper numeric mode
    GRAPHIC.NUMERIC OF
      N.STRING MEASURES>FIXED
      GRAPHIC.SHIFT
      NORMAL.SHIFT -
        FIX.SCALE - SCALE         \ for graphic
    ENDOF
    INTEGER.NUMERIC OF
      N.STRING NNUMBER           \ for int
    ENDOF
    FIXED.NUMERIC OF
      N.STRING MEASURES>FIXED        \ for fixed
    ENDOF
    MEASURE.NUMERIC OF
      N.STRING MEASURES>MEASURE      \ for measure
    ENDOF
    ANGLE.NUMERIC OF
      N.STRING MEASURES>ANGLE      \ for measure
    ENDOF
   ENDCASE
  ELSE
    N.STRING DUP C@ 1+
    PARSE.COMMAND SWAP CMOVE        \ else post error
    NOT.RECOGNIZED TO PARSE.ERROR.FLAG
  THEN ;


: SWIVEL.FIND                  \ string -- token flag
0 0 LOCALS| C.TOKEN V.POINTER C.STRING
SWIVEL.ENTRIES 0 DO              \ loop through all entries
  SWIVEL.VOCAB V.POINTER +          \ test the string
  C.STRING -STRING 0 = IF
    SWIVEL.VOCAB V.POINTER + DUP       \ if a match fetch the token
    C@ 1+ ALIGN +
      W@ TO C.TOKEN
  THEN
  V.POINTER                  \ increment the pointer
  SWIVEL.VOCAB V.POINTER + C@ 1+ ALIGN 2+
  + TO V.POINTER
LOOP
C.TOKEN C.TOKEN 0= NOT ;            \ token, flag


: SWIVEL.TOKEN?                 \ string -- flag ...find and execute token
LOCALS| C.STRING |
C.STRING SWIVEL.FIND              \ find the token
IF  C.STRING DUP C@ 1-
  PARSE.COMMAND SWAP CMOVE
  EXECUTE -1  THEN  ;             \ execute if valid
```

-000755

6/1/90 20:07 TEXT.PARSE Page 21

```
: PARSE.TEXT.HANDLE                 \ handle -- parses and executes text
  0 LOCALS| STACK.POS |
  TO T.HANDLE
  0 TO PARSE.ERROR.FLAG
  0 TO ERROR.FLAG
  0 TO EXIT.FLAG
  0 TO B.POINTER
  0 TO E.POINTER
  0 TO CURRENT.TEXT.LINE
  GET.STACK TO STACK.POS
  0 0 0 0 0 0 0 0 0 0
  STACK.BOTTOM
  BEGIN
    NEXT.WORD IF                   \ if beginning pointer is within size
      PAD SWIVEL.TOKEN? NOT IF          \ execute if token
        PAD PARSE.NUMERIC          \ else parse numeric
      THEN
      ?CMD-PERIOD                  \ continue if not user abort
      EXIT.FLAG OR
      PARSE.ERROR.FLAG OR             \ continue if not an error
      ERROR.FLAG OR
    ELSE -1 THEN                   \ if out of range then end
  UNTIL
  HideWork
  ExitPreview
  STACK.BOTTOM = NOT IF
    BAD.ARGS TO PARSE.ERROR.FLAG
  THEN
  STACK.POS PUT.STACK
  ERROR.FLAG IF
    DO.ERROR.ALERT
  THEN
  PARSE.ERROR.FLAG IF               \ post error if there is one
    HANDLE.PARSE.ERROR
  THEN ;


: PARSE.SCRAP                        \ parse the scrap
 0 FROM.MIN.HEAP                       \ fetch an empty handle
   LOCALS|  T.HANDLE
 T.HANDLE "TEXT GET.SCRAP TO ERROR.FLAG        \ get text from scrap
 ERROR.FLAG 0 < IF                     \ test for error
   DO.ERROR.ALERT                    \ post if needed
 ELSE
   T.HANDLE LOCK.HANDLE                \ lock the text handle
   T.HANDLE PARSE.TEXT.HANDLE               \ parse and execute
   T.HANDLE UNLOCK.HANDLE                \ unlock the handle
   T.HANDLE TO.HEAP                  \ return to heap
 THEN ;


FIND PARSE.SCRAP ' ^PARSE.SCRAP


( get.file )


: PARSE.COMMAND.FILE               \ presents SFgetFile, Opens file parses and closes
  0 0 LOCALS| TEXT.HANDLE  FILE.ID       \ define locals
  REPLY 74 ERASE 75 75 XY>POINT        \ let system center the thing
  16 203 ResString               \ " Open Command File "
  ' "TEXT 1 REPLY (GET.FILE)          \ fetch the file
  REPLY C@ BOOLEAN DUP
  IF                       \ if not a cancel....
```

-000756

```
REPLY 6+ <W@ VOLREF# !          \ set one.shots
  IODIR OFF
REPLY 10+ OPEN$ TO FILE.ID      \ open the file
POST.FILE.ERROR?
FILE.ID IF                \ if a good file...
  FILE.ID FILESIZE?
  FROM.MIN.HEAP TO TEXT.HANDLE    \ allocate a handle the size of the file
  TEXT.HANDLE IF          \ if a good handle ...
    TEXT.HANDLE LOCK.HANDLE    \ lock it
    TEXT.HANDLE @         \ address
    FILE.ID FILESIZE?       \ size
    0 FILE.ID         \ offset and id
    READ.VIRTUAL        \ read to memory
    FILE.ID CLOSE         \ close the file
    POST.FILE.ERROR?      \ post error if needed
    ERROR.FLAG 0 = IF       \ if no error
      TEXT.HANDLE       \ parse the text
      PARSE.TEXT.HANDLE
    THEN
    TEXT.HANDLE UNLOCK.HANDLE    \ unlock the handle
    TEXT.HANDLE TO.HEAP     \ dispose of the handle
    ELSE -108 TO ERROR.FLAG     \ if bad handle post error
     DO.ERROR.ALERT
  THEN
 THEN
THEN ;
```

```
\ POLY SORT AND DRAW ENGINE FOR PICT AND LASER WRITER

 ANEW -ToolBox.Draw-

CR ." Loading Toolbox Drawing..."


DECIMAL

130   CONSTANT picDwgBeg    \ Begin a MacDraw Picture
131   CONSTANT picDwgEnd    \ End a MacDraw Picture

140   CONSTANT picGrpBeg    \ Begin a group
141   CONSTANT picGrpEnd    \ End a group

 72 CONSTANT  TBoxVertRes
 72 CONSTANT  TBoxHorizRes


GLOBAL VERT.COUNT

16 CONSTANT SIG.DIGITS                \ number of significant digits in the depth sort
 1 SIG.DIGITS SCALE 2/ CONSTANT SIG.OFF

\ define polygon record

STRUCTURE POLY.RECORD                 \ record for a four-sided poly
  LONG: +DEPTH
  LONG:  THE.POINTS
  LONG: #THE.POINTS
  SHORT: +R.MODE
  SHORT: +COLOR.SPEC
  SHORT: +RED.RGB
  SHORT: +GREEN.RGB
  SHORT: +BLUE.RGB
STRUCTURE.END


: +object.y   THE.POINTS ;
: +object.x   #THE.POINTS ;
: +object.id  +R.MODE  ;


  : NUMBER.PATH.POLYS
    (CONTOUR)  DROP @ 4/ 1-
    (CCONTOUR) DROP @ 4/ 1- *
    OBJECT.FORM.RENDER PLUCK
      TRIANGLE.MESH.BIT AND  IF
       2*
    THEN
    DUP POLY.COUNT + TO POLY.COUNT
    4*  VERT.COUNT + TO VERT.COUNT
     ;

  : NUMBER.MESH.POLYS
    (ALL.POINTS) DROP @ 1-
    (ALL.POINTS) DROP 4+ @ 1- *
    OBJECT.FORM.RENDER PLUCK
    TRIANGLE.MESH.BIT AND  IF
       2*
    THEN
    DUP POLY.COUNT + TO POLY.COUNT
    4*  VERT.COUNT + TO VERT.COUNT
      ;
```

-000758

```
: NUMBER.POLY.POLYS
  OBJECT.TYPE DROP
  LOCALS| THE.LIST |
  BEGIN THE.LIST W@ WHILE
    POLY.COUNT 1+ TO POLY.COUNT
    VERT.COUNT THE.LIST W@ + TO VERT.COUNT
    THE.LIST W@ 12 * 2 +
    THE.LIST + TO THE.LIST
  REPEAT ;

: NUMBER.POLYNORMAL.POLYS
  OBJECT.TYPE DROP
  LOCALS| THE.LIST |
  BEGIN THE.LIST W@ WHILE
    POLY.COUNT 1+ TO POLY.COUNT
    VERT.COUNT THE.LIST W@ + TO VERT.COUNT
    THE.LIST W@ 24 * 2 +
    THE.LIST + TO THE.LIST
  REPEAT ;


: NUMBER.OBJECT.POLYS               \ finds the number of object polygons
  OBJECT.FORM PLUCK
  CASE
    PATH.FORM OF
      NUMBER.PATH.POLYS
    ENDOF
    MESH.FORM OF
      NUMBER.MESH.POLYS
    ENDOF
    POLY.FORM OF
      NUMBER.POLY.POLYS
    ENDOF
    POLYNORMAL.FORM OF
      NUMBER.POLYNORMAL.POLYS
    ENDOF
  ENDCASE
  ;

FIND NUMBER.OBJECT.POLYS
CONSTANT ^NUMBER.OBJECT.POLYS          \ tokenize for traversing the tree


: NUMBER.TREE.POLYS               \ finds the number of polygons in the whole tree
  OPERATION @
  LOCALS| C.OPERATION
  0 TO POLY.COUNT
  0 TO VERT.COUNT
  ^NUMBER.OBJECT.POLYS
  OPERATION !
  TRAVERSE.DOWN.TREE
  C.OPERATION OPERATION ! ;

: NUMBER.OBJECT                  \ finds the number of object polygons
  POLY.COUNT 1+ TO POLY.COUNT ;

FIND NUMBER.OBJECT
CONSTANT ^NUMBER.OBJECT             \ tokenize for traversing the tree

: NUMBER.OBJECTS                 \ finds the number of polygons in the whole tree
  OPERATION @
  LOCALS| C.OPERATION |
```

-000759

```
  0 TO POLY.COUNT
  ^NUMBER.OBJECT
  OPERATION !
  TRAVERSE.DOWN.TREE
  C.OPERATION OPERATION ! ;

: THIS.POLY                   \ --- ^ to current polygon record in poly array
  POLY.ARRAY
  CURRENT.POLY.OFFSET + ;

: INC.CURRENT.POLY              \ -- increments current poly record
  CURRENT.APOLY.RECORD 1+
  POLY.COUNT MIN
  DUP TO CURRENT.APOLY.RECORD
  POLY.RECORD *
  TO CURRENT.POLY.OFFSET ;

: SET.CURRENT.POLY              \ n -- sets index for current poly record
  POLY.COUNT MIN
  DUP TO CURRENT.APOLY.RECORD
  POLY.RECORD *
  TO CURRENT.POLY.OFFSET ;

: THIS.TPOLY                  \ -- ^ to current temp poly in temp poly array
  TEMP.POLY.ARRAY
  CURRENT.TPOLY.OFFSET + ;

: INC.CURRENT.TPOLY             \ -- increments the current temp poly
  CURRENT.TPOLY.RECORD 1+
  POLY.COUNT MIN
  DUP TO CURRENT.TPOLY.RECORD
  POLY.RECORD *
  TO CURRENT.TPOLY.OFFSET ;

: SET.CURRENT.TPOLY             \ n -- sets index for current poly record
  POLY.COUNT MIN
  DUP TO CURRENT.TPOLY.RECORD
  POLY.RECORD *
  TO CURRENT.TPOLY.OFFSET ;

: TEMP>POLY                   \ writes temp.polys to poly array
  TEMP.POLY.ARRAY
  POLY.ARRAY
  POLY.COUNT POLY.RECORD *
  CMOVE ;

: BIN.POLYS                   \ bins polys into 0's or 1's based on test mask
  LOCALS| TEST.MASK |
  0 SET.CURRENT.POLY
  0 SET.CURRENT.TPOLY             \ set both array pointers to 0
  POLY.COUNT 0 DO               \ start first loop
  THIS.POLY @ TEST.MASK AND IF        \ test for a 1
    THIS.POLY
    THIS.TPOLY POLY.RECORD CMOVE      \ if its a one then move to temp array
    INC.CURRENT.TPOLY             \ increment the temp array
  THEN
  INC.CURRENT.POLY              \ always increment the poly array and loop
  LOOP
  0 SET.CURRENT.POLY              \ reset only poly array
  POLY.COUNT 0 DO               \ for the count of all the polys
  THIS.POLY @ TEST.MASK AND NOT IF        \ test for zero in mask position
    THIS.POLY THIS.TPOLY POLY.RECORD CMOVE  \ if zero, move record to temp
    INC.CURRENT.TPOLY             \ increment the temp array pointer
  THEN
```

-000760

```
  INC.CURRENT.POLY              \ increment the current poly
  LOOP
  TEMP>POLY ;                   \ move the temp array to the poly array


: SORT.POLYS                    \ sort the polys in poly array by z depth
  1 LOCALS| TEST.MASK |              \ test mask starts at lsb
  SIG.DIGITS 0 DO               \ loop number of significant digits
    TEST.MASK BIN.POLYS           \ bin the polys
    TEST.MASK 1 SCALE TO TEST.MASK      \ increment the mask and repeat till done
  LOOP ;


: P.OUT                         \ moves the xy point to its screen position
  YOFFSET @ + SWAP
  XOFFSET @ + SWAP ;


: GET.POLY.RGB                  \ calc rgb for current poly
  TWO.VECTOR                    \ fetch the vectors
  CROSS.PRODUCT                 \ find the perpendicular vector
  NORMALIZE                     \ normalize
  FULL.SHADE                    \ calc the shade
  PAT# @
  THIS.POLY +COLOR.SPEC W!          \ store index in color spec of poly
  PAT# @
  THIS.POLY +RED.RGB
  BACKINDEX2COLOR   ;             \ calc rgb and store in poly record


: SET.POLY.SHADING              \ sets shading based on render mode
  POLY.GLOBAL.RENDER IF           \ if using global render
    RENDER.MODE @               \ just use the render mode
  ELSE
    OBJECT.RENDER PLUCK           \ else use local rendering
  THEN
  THIS.POLY +R.MODE W! ;


: TBoxVertScale         \ to adjust resolution for printing
  TBoxVertRes 72 = not if
    TBoxVertRes *
    36 +
    72 /          \ for rounding
  then ;

: TBoxHorizScale          \ to adjust resolution for printing
  TBoxHorizRes 72 = not if
    TBoxHorizRes *
    36 +
    72 /          \ for rounding
  then ;

: RES.SCALE
  >R
  TBoxVertScale swap
  TBoxHorizScale swap
  R> ;
```

-000761

```
  : TRANS.Tool.POINT                        \ shunts poly.points
    POLY.POINTS LOCALS| C.ADDRESS .
  JUST.TRANS.CLIP
    #POLY.POINTS @ 0  DO
        C.ADDRESS  TO.STACK
      RES.SCALE
        FIX>INTEGER C.ADDRESS !       \ set as integer
        YOFFSET @ TBoxVertScale +  SWAP   \ modify for local coords
        XOFFSET @ TBoxHorizScale -  SWAP
        C.ADDRESS 4+ !  C.ADDRESS 8+ !
      C.ADDRESS 12 + TO C.ADDRESS
    LOOP ;

0 CONSTANT ^WRITE.POLY.RECORD

 : WRITE.POLY.RECORD                   \ writes out the poly to the poly array
   0 POLY.POINTS LOCALS| C.ADDRESS Z.AV |
   CURRENT.OBJECT @ WORLD.OBJECT > IF
     TRANS.TOOL.POINT
     TWO.VECTOR                        \ fetch the vectors
     CROSS.PRODUCT DUP 0 >
     CULL.BACK? @ OR
     #POLY.POINTS @ 2 > AND IF              \ check for backplane
       NORMALIZE                       \ normalize
       FULL.SHADE                      \ calc the shade
       PAT# @
       THIS.POLY +COLOR.SPEC W!            \ store index in color spec of poly
       PAT# @
       THIS.POLY +RED.RGB
       BACKINDEX2COLOR
       POLY.HUNK.LIST HUNK.POINTER +
       THIS.POLY THE.POINTS !
       #POLY.POINTS @ THIS.POLY #THE.POINTS !
       #POLY.POINTS @ 0 DO
           C.ADDRESS TO.STACK
           SIG.OFF + Z.AV MAX TO Z.AV
           XY>POINT
           POLY.HUNK.LIST HUNK.POINTER +  !
           HUNK.POINTER 4 + TO HUNK.POINTER
           C.ADDRESS 12 + TO C.ADDRESS
       LOOP
       Z.AV  THIS.POLY +DEPTH !
       SET.POLY.SHADING
       POLY.COUNT 1 + TO POLY.COUNT
       CURRENT.APOLY.RECORD 1 - SET.CURRENT.POLY   \ increment the counter
     ELSE
       DROP 2DROP
     THEN
   THEN ;

  FIND WRITE.POLY.RECORD ' ^WRITE.POLY.RECORD !

  : WRITE.SORT.OBJECT               \ WRITE OUT AN OBJECT TO POLY ARRAY
    CURRENT.OBJECT WORLD.OBJECT > IF
      CURRENT.OBJECT @ THIS.POLY -OBJECT.ID !
      OBJECT.A3POS PLUCK
      FIX>INTEGER
      THIS.POLY +DEPTH !
      THIS.POLY +OBJECT.Y !
```

-000762

```
    THIS.POLY +OBJECT.X !
      POLY.COUNT 1+ TO POLY.COUNT
    CURRENT.APOLY.RECORD 1+ SET.CURRENT.POLY
  THEN ;


FIND WRITE.SORT.OBJECT
CONSTANT ^WRITE.SORT.OBJECT


: WRITE.SORT.TREE                \ finds the number of polygons in the whole tree
  OPERATION @
  LOCALS| C.OPERATION !
  ^WRITE.SORT.OBJECT
  OPERATION !
  TRAVERSE.DOWN.TREE
  C.OPERATION OPERATION ! ;


\ polygon definitions


: SHADE.TOOL.POLY                \ shades the current poly
  0 LOCALS| THE.PAT C.POLY
  NEWPIXPAT TO THE.PAT
  THE.PAT THIS.POLY +RED.RGB MAKERGBPAT
  THE.PAT PENPIXPAT
  C.POLY PAINT POLYGON
  THE.PAT DISPOSPIXPAT
  BLACK PENPAT ;


: TOOL.RENDER                \ renders the poly according to swivel rendering modes
  LOCALS| C.POLY |
  THIS.POLY +R.MODE W@
  CASE
    WIREFRAME   OF
      C.POLY FRAME POLYGON ENDOF       \ wireframe is just frame the poly
        HIDDENLINE  OF
      C.POLY WHITE PATTERN POLYGON     \ hiddenline is white fill and frame
      C.POLY FRAME POLYGON ENDOF
        SHADEDLINE  OF
      C.POLY SHADE.TOOL.POLY         \ shadeline is shaded and framed
      C.POLY FRAME POLYGON ENDOF
    SHADED OF
      C.POLY SHADE.TOOL.POLY ENDOF     \ shade is just shaded poly
        PHONG OF
      C.POLY SHADE.TOOL.POLY ENDOF     \ phong is just shaded poly
  ENDCASE ;


: WRITE.TOOL.POLY                \ writes the current poly out as a toolbox poly
  0 LOCALS| C.POLY |
  THIS.POLY THE.POINTS @  0 = NOT IF
  POLY.IS:
  THIS.POLY THE.POINTS @
   @ POINT>XY   (MOVE.TO)
  THIS.POLY #THE.POINTS @ 1 DO
    THIS.POLY THE.POINTS @
    I 4* + @ POINT>XY  (LINE.TO)
```

000763

```
    LOOP
   THIS.POLY THE.POINTS @
    @ POINT>XY  (LINE.TO)
   POLY.END                    \ close the poly
   TO C.POLY                     \ set local to poly handle
   C.POLY TOOL.RENDER                \ render using swivel render modes
   C.POLY DISPOSE.POLY
   THEN ;                      \ dispose of the poly


 : WRITE.TOOL.POLYS                  \ writes all the polys in the array out as toolbox polys
   POLY.COUNT  0 DO
     I SET.CURRENT.POLY
     0 ?HEAP.SIZE MINHEAPSIZE > IF        \ check for room in heap
        WRITE.TOOL.POLY
     ELSE -1 SCRAP.FLAG !
     THEN
   LOOP ;


: DRAW.TOOLBOX.TREE                 \ draws the tree with the toolbox poly
   WATCH SET.CURSOR
   GLOBAL.RENDER @ TO POLY.GLOBAL.RENDER
     ALT.POLY @
   0 0 0 LOCALS| MEM.RESULT POLY.HANDLE POLY.HUNKS C.ALT
   -1 GLOBAL.RENDER !
   ^WRITE.POLY.RECORD ALT.POLY !
   NUMBER.TREE.POLYS
   POLY.COUNT 2 + POLY.RECORD * 2*
   NEW.CLEAR.HANDLE TO MEM.RESULT
   TO POLY.HANDLE
   MEM.RESULT 0= IF
     VERT.COUNT 8 + 4 *
     NEW.CLEAR.HANDLE  TO MEM.RESULT
     TO POLY.HUNKS
     MEM.RESULT 0= IF
       POLY.HANDLE @ TO POLY.ARRAY
       POLY.ARRAY POLY.COUNT 2 - POLY.RECORD * -
       TO TEMP.POLY.ARRAY
       POLY.HANDLE LOCK.HANDLE
       POLY.HUNKS @ TO POLY.HUNK.LIST
       POLY.HUNKS LOCK.HANDLE
       0 TO HUNK.POINTER
       0 SET.CURRENT.POLY
       0 TO POLY.COUNT
       DRAW.TREE
       WATCH SET.CURSOR
       SORT.POLYS
       WRITE.TOOL.POLYS
       C.ALT ALT.POLY !
       POLY.HUNKS UNLOCK.HANDLE
       POLY.HUNKS TO.HEAP
     ELSE
       10 SYSBEEP
       MEM.RESULT TO ERROR.FLAG
     THEN
     POLY.HANDLE UNLOCK.HANDLE
     POLY.HANDLE TO.HEAP
   ELSE
     10 SYSBEEP
     MEM.RESULT TO ERROR.FLAG
   THEN
   C.ALT ALT.POLY !
```

```
POLY.GLOBAL.RENDER GLOBAL.RENDER ;
INIT.CURSOR  ;
```

```
\ new tween panel

ANEW TWEEN.PANEL.FILE

cr ." Loading Tweening.Panel..."

   New.Window TWEENING.WINDOW

  5002 NEW.DIALOG.RECORD

  1 MAKE.ACTIVE.ITEM  TWEEN.BUTTON
  2 MAKE.ACTIVE.ITEM  TWEEN.Preview
  3 MAKE.ACTIVE.ITEM  TWEEN.Options
  4 MAKE.CHECK.ITEM   TWEEN.Loop
  5 MAKE.TEXT.ITEM  TWEEN.PCount
    6 MAKE.TEXT.ITEM    TWEEN.KeyTotal
  7 MAKE.ACTIVE.ITEM  TWEEN.Last
  8 MAKE.ACTIVE.ITEM  TWEEN.Next
    9 MAKE.TEXT.ITEM    TWEEN.Keyframe
   10  MAKE.TEXT.ITEM   TWEEN.FRAMES
   11 MAKE.ACTIVE.ITEM  TWEEN.Key
   12 MAKE.ACTIVE.ITEM  TWEEN.Add.Key
   13 MAKE.ACTIVE.ITEM  TWEEN.CLEAR.Key


 NAME.DIALOG.RECORD TWEEN.PANEL

 100 CONSTANT TWEEN.MAX

: GET.TWEEN.VARS     ( FETCHES CURRENT.OBJECT TO PANEL )
    TWEEN.FACTOR @
  TWEEN.PCOUNT CLEAR.STRING #>S!
  KEY.TWEEN.COUNT@ DUP
  TWEEN.COUNT !
    TWEEN.FRAMES CLEAR.STRING #>S!
  CURRENT.KEY @ 1+
  TWEEN.Keyframe CLEAR.STRING #>S!
  Key.COUNT @  1+
    TWEEN.KeyTotal CLEAR.STRING #>S!
  LOOP.TWEEN? @ ABS TWEEN.Loop !  ;

: SET.TWEEN.VARS
  TWEEN.PCOUNT NNUMBER 0 MAX TWEEN.MAX MIN TWEEN.FACTOR !
  TWEEN.FRAMES NNUMBER 0 MAX 1000 MIN
  DUP TWEEN.COUNT !
  KEY.TWEEN.COUNT!
  TWEEN.Keyframe NNUMBER 1 - 0 MAX KEY.MAX 1- MIN CURRENT.KEY !
  TWEEN.KeyTotal NNUMBER 1 - 0 MAX KEY.MAX 1- MIN Key.COUNT !
  TWEEN.Loop @ LOOP.TWEEN? ! ;

: PerformOneTween
  TWEEN.WORLD
  OPTION.BITS @ OPTION.VIEW.BIT AND
  CURRENT.OBJECT @  WORLD.OBJECT - NOT AND IF
    MOVING SET.TREE.STATE        \ set state of object tree to moving
    CURRENT.OBJECT @
    DISPLAY.OBJECT.VIEW
    ACTIVE SET.TREE.STATE
  ELSE
    DISPLAY.TWEENING
  THEN
  ;
```

-000766

```
: DO.TWEENING
  WORLD.OUTPUT ?ACTIVE.WPTR IF
  CLEAR.REDRAW RE.TOGGLE CLEAR.REDRAW        \ clear the line cursor
  0 DRAW.CHECK !
  OPTION.BITS @ OPTION.VIEW.BIT AND          \ if from object's view
  CURRENT.OBJECT @ WORLD.OBJECT = NOT AND    \ and if not the world object
  OPTION.BITS @ OPTION.FAST.BIT AND OR IF    \ or if there is a fast tween
    WORLD.OBJECT TREE.CHANGED + CHANGED.FLAG !
  THEN
  0 TO ERROR.FLAG
  0 to EXIT.FLAG
  OPTION.BITS @ OPTION.PICS.BIT AND  IF
    INIT.TWEEN.PICS
  THEN
  OPTION.BITS @ OPTION.SCRAP.BIT AND  IF
    INIT.TWEEN.ZSYS
  THEN
  OPTION.BITS @ OPTION.PAINT.BIT AND
  FILE.STYLE 8 =
  FILE.STYLE 9 = OR AND IF
    display.init EXECUTE
  THEN
  0 SET.CURRENT.KEY
  EXIT.FLAG 0=
  TWEEN.COUNT @ 0 > AND
  TWEEN.FACTOR @ -1 > AND
  CURRENT.KEY @ ADJUSTED.KEY.COUNT < AND IF
  CURRENT.KEY @ SET.CURRENT.KEY
  -1 TO IN.TWEEN?
  BEGIN
    0 TWEEN.FACTOR !
    BEGIN
      PerformOneTween
      TWEEN.FACTOR @ 1+ TWEEN.FACTOR !
      ?CMD-PERIOD IF
        -1 TO EXIT.FLAG
      THEN
      ERROR.FLAG
      EXIT.FLAG OR
      TWEEN.FACTOR @ TWEEN.COUNT @ 1- > OR
    UNTIL
    0 TWEEN.FACTOR !
    CURRENT.KEY @ 1+ SET.CURRENT.KEY
    CURRENT.KEY @ KEY.COUNT @ 1- >
    LOOP.TWEEN? @ NOT AND
    ERROR.FLAG    NOT AND
    EXIT.FLAG     NOT AND IF
      PerformOneTween              \ if not a loop, do end tween
    THEN
    ERROR.FLAG
    EXIT.FLAG OR
    CURRENT.KEY @ ADJUSTED.KEY.COUNT 1- > OR
  UNTIL
  0 TO IN.TWEEN?
  THEN
  DO.ERROR.ALERT
  UNDRAW.POLY.CURSOR
  0 TWEEN.FACTOR !
  OPTION.BITS @ OPTION.VIEW.BIT AND
  CURRENT.OBJECT @ WORLD.OBJECT = NOT AND    \ if its object's view and not the world
  OPTION.BITS @ OPTION.FAST.BIT AND OR IF    \ or if we have been rendering fast
    CURRENT.OBJECT @ >R              \ redraw the world
    WORLD.OBJECT SET.CURRENT.OBJECT
    REDRAW.OBJECT
```

-000767

```
    DISPLAY.WORLD.OUTPUT
    R> SET.CURRENT.OBJECT
    CURRENT.OBJECT @ CHANGED.FLAG !
  ELSE
    EFFECT.BITS @  OPTION.SHADOW.BIT AND IF
      DRAW.WORLD.OBJECT.BUFFER
    THEN
  THEN
  THEN ;

: DISPLAY.PANEL.TWEEN
    OPTION.BITS @ OPTION.VIEW.BIT AND
    CURRENT.OBJECT @  WORLD.OBJECT - NOT AND IF
      MOVING SET.TREE.STATE
      CURRENT.OBJECT @
      DISPLAY.OBJECT.VIEW
      active SET.TREE.STATE
    ELSE
      DISPLAY.TWEENING
    THEN  ;

 : TRACK.ITEM
    -1 LOCALS| IN.FLAG C.ITEM
    C.ITEM ITEM.RECT + (INVERT.RECT)
    BEGIN
      @MOUSE C.ITEM ITEM.RECT +
      PTINRECT IF
        IN.FLAG NOT IF
          C.ITEM ITEM.RECT + (INVERT.RECT)
            -1 TO IN.FLAG
        THEN
      ELSE
        IN.FLAG IF
          C.ITEM ITEM.RECT + (INVERT.RECT)
            0 TO IN.FLAG
        THEN
      THEN
    MOUSE.BUTTON NOT UNTIL
    IN.FLAG IF
      C.ITEM ITEM.RECT + (INVERT.RECT)
    THEN
    @MOUSE C.ITEM ITEM.RECT + PTINRECT ;

: DO.NEXT.KEY
  LOCALS| C.ITEM HIT.ITEM C.RECORD
  C.ITEM TRACK.ITEM IF
    WORLD.OUTPUT ?ACTIVE.WPTR IF
    TWEEN.PANEL GET.ITEM.DATA
    SET.TWEEN.VARS
    NEXT.KEY.FRAME
    GET.TWEEN.VARS
    TWEEN.PANEL SET.ITEMS
    WORLD.OBJECT TREE.CHANGED + CHANGED.FLAG !
    THEN
  THEN ;

  FIND DO.NEXT.KEY TWEEN.NEXT !

: DO.LAST.KEY
  LOCALS| C.ITEM HIT.ITEM C.RECORD
  C.ITEM TRACK.ITEM IF
```

```
    WORLD.OUTPUT ?ACTIVE.WPTR IF
      TWEEN.PANEL GET.ITEM.DATA
      SET.TWEEN.VARS
      LAST.KEY.FRAME
      GET.TWEEN.VARS
      TWEEN.PANEL SET.ITEMS
      WORLD.OBJECT TREE.CHANGED - CHANGED.FLAG !
    THEN
  THEN ;

  FIND DO.LAST.KEY TWEEN.LAST !


: DO.TWEEN.BUTTON
  LOCALS| C.ITEM HIT.ITEM C.RECORD
  WORLD.OUTPUT ?ACTIVE.WPTR IF
    CLEAR.REDRAW RE.TOGGLE CLEAR.REDRAW        \ clear the line cursor
    0 DRAW.CHECK !
    TWEEN.PANEL GET.ITEM.DATA
    SET.TWEEN.VARS
    0 TO ERROR.FLAG
    0 to EXIT.FLAG
    OPTION.BITS @ OPTION.PICS.BIT AND  IF
      INIT.TWEEN.PICS
    THEN
    OPTION.BITS @ OPTION.SCRAP.BIT AND  IF
      INIT.TWEEN.ZSYS
    THEN
    OPTION.BITS @ OPTION.PAINT.BIT AND
    FILE.STYLE 8 =
    FILE.STYLE 9 = OR AND IF
      display.init EXECUTE
    THEN
    0 SET.CURRENT.KEY
    EXIT.FLAG 0=
    TWEEN.COUNT @ 0 > AND
    TWEEN.FACTOR @ -1 > AND
    CURRENT.KEY @ ADJUSTED.KEY.COUNT < AND IF
      -1 TO IN.TWEEN?
      BEGIN
        0 TWEEN.FACTOR !
        BEGIN
          TWEEN.WORLD
          DISPLAY.PANEL.TWEEN
          GET.TWEEN.VARS
          TWEEN.PANEL SET.ITEMS
          TWEEN.FACTOR @ 1+ TWEEN.FACTOR !
          ?CMD-PERIOD IF
            -1 TO EXIT.FLAG
          THEN
          ERROR.FLAG
          EXIT.FLAG OR
          TWEEN.FACTOR @ TWEEN.COUNT @ 1- > OR
        UNTIL
        0 TWEEN.FACTOR !
        CURRENT.KEY @ 1+ SET.CURRENT.KEY
        CURRENT.KEY @ KEY.COUNT @ 1- >
        LOOP.TWEEN? @ NOT AND
        ERROR.FLAG    NOT AND
        EXIT.FLAG     NOT AND IF
          TWEEN.WORLD
          DISPLAY.PANEL.TWEEN           \ if not a loop, do end tween
        THEN
        GET.TWEEN.VARS
```

-000769

```
      TWEEN.PANEL SET.ITEMS
      ERROR.FLAG
      EXIT.FLAG OR
      CURRENT.KEY @ ADJUSTED.KEY.COUNT 1- > OR
    UNTIL
    0 TO IN.TWEEN?
  THEN
  DO.ERROR.ALERT
  UNDRAW.POLY.CURSOR
  0 TWEEN.FACTOR !
  GET.TWEEN.VARS
  TWEEN.PANEL SET.ITEMS
  OPTION.BITS @ OPTION.VIEW.BIT AND
  CURRENT.OBJECT @ WORLD.OBJECT = NOT AND     \ if its object's view and not the world
  OPTION.BITS @ OPTION.FAST.BIT AND OR  IF    \ or if we have been rendering fast
    CURRENT.OBJECT @ >R              \ redraw the world
    WORLD.OBJECT SET.CURRENT.OBJECT
    REDRAW.OBJECT
    DISPLAY.WORLD.OUTPUT
    R> SET.CURRENT.OBJECT
    CURRENT.OBJECT @ CHANGED.FLAG !
  ELSE
    EFFECT.BITS @  OPTION.SHADOW.BIT AND IF
      DRAW.WORLD.OBJECT.BUFFER
    THEN
  THEN
THEN
DROP 2 ;

FIND DO.TWEEN.BUTTON TWEEN.BUTTON !


: SET.THIS.KEY
  LOCALS| C.ITEM HIT.ITEM C.RECORD
  WORLD.OUTPUT ?ACTIVE.WPTR IF
    TWEEN.PANEL GET.ITEM.DATA
    SET.TWEEN.VARS
    SET.KEY.FRAME
  THEN ;

  FIND SET.THIS.KEY TWEEN.KEY !


: ADD.THIS.KEY
  LOCALS| C.ITEM HIT.ITEM C.RECORD
  WORLD.OUTPUT ?ACTIVE.WPTR IF
    TWEEN.PANEL GET.ITEM.DATA
    SET.TWEEN.VARS
    ADD.KEY.FRAME
    GET.TWEEN.VARS
    TWEEN.PANEL GET.ITEMS          \ fetch item handles, rects
    TWEEN.PANEL SET.ITEMS          \ set booleans, text
  THEN ;

  FIND ADD.THIS.KEY TWEEN.ADD.KEY !

: CLEAR.THIS.KEY
  LOCALS| C.ITEM HIT.ITEM C.RECORD
  WORLD.OUTPUT ?ACTIVE.WPTR IF
    TWEEN.PANEL GET.ITEM.DATA
    SET.TWEEN.VARS
    DELETE.KEY.FRAME
    GET.TWEEN.VARS
```

```
    TWEEN.PANEL GET.ITEMS            \ fetch item handles, rects
    TWEEN.PANEL SET.ITEMS            \ set booleans, text
  THEN ;

 FIND CLEAR.THIS.KEY TWEEN.CLEAR.KEY !


: TWEEN.OPTIONS.BUTTON
 LOCALS| C.ITEM HIT.ITEM C.RECORD
 TWEEN.PANEL GET.ITEM.DATA          \ if deactivated fetch changes
 SET.TWEEN.VARS
 DO.TWEEN.OPTIONS
 DISCARD.ACTIVATES ;


 FIND TWEEN.OPTIONS.BUTTON TWEEN.OPTIONS !


  : TWEEN.FAST.PREVIEW
   OPTION.BITS @ GET.WINDOW
   LOCALS| C.WINDOW C.OPTIONS
   WORLD.OUTPUT ?ACTIVE.WPTR IF
     WORLD.OUTPUT +HBAR @ 0 0 SET.CONTROL.RANGE
     WORLD.OUTPUT +VBAR @ 0 0 SET.CONTROL.RANGE
     WORLD.OUTPUT BRING.TO.FRONT
     WORLD.OUTPUT WINDOW
     PAGE
     CLEAR.EDGE
     V.TOOL.WIDTH -1          \ display the bounds of the current backport
     ZBUFFERX @ V.TOOL.WIDTH - 1-
       ZBUFFERY @
     FRAME RECTANGLE
     HILITE.V.TOOL
     OPTION.BITS @
     OPTION.VIEW.BIT AND
     OPTION.FAST.BIT OR
     OPTION.BITS !
     DO.TWEEN.BUTTON
     C.OPTIONS OPTION.BITS !
    THEN
    C.WINDOW WINDOW
    TWEENING.WINDOW BRING.TO.FRONT ;

  FIND TWEEN.FAST.PREVIEW TWEEN.Preview !



   : UPDATE.TWEENING.WINDOW
     TWEENING.WINDOW DRAW.DIALOG ;


: DO.TWEEN.PANEL
    TWEEN.PANEL
  LOCALS| C.DIALOG |
  IF TWEENING.WINDOW DPUSH       \ push current dialog on a stack
    GET.TWEEN.VARS
      C.DIALOG GET.ITEMS         \ fetch item handles, rects
      C.DIALOG SET.ITEMS         \ set booleans, text
     BEGIN             \ start of event handling
    DO.EVENTS IN.CLOSE.BOX : IF    \ check for close
      TWEENING.WINDOW CLOSE.DIALOG
      DPOP DROP
    THEN
    ?KEYSTROKE IF DROP THEN      \ handle keystrokes
```

-000771

```
  DIALOG.EVENT?             \ check for dialog events
    IF SWAP DGET = IF         \ if dialog event check for current
    C.DIALOG HANDLE.ITEMS      \ if current handle items
    THEN
    ELSE 2DROP THEN         \ else drop dialog event args
   AGAIN                 \ endless loop until deactivated
  ELSE
   C.DIALOG GET.ITEM.DATA       \ if deactivated fetch changes
   SET.TWEEN.VARS
   DPOP DROP               \ pop dialog from stack
 THEN  ;


: DOWN.SCREEN  ( t\l\b\r -- t'\l'\b'\r' )
   screen.bounds @rect
 locals| sx2 sy2 sx1 sy1 wx2 wy2 wx1 wy1 |
 wY1 wY2 - to wY1
 0 to wY2
 sY2 10 - wY2 + to wY2
 sY2 10 - wY1 + to wY1
 wy1 wx1 wy2 wx2  ;


: INIT.TWEEN.PANEL
   0 LOCALS| D.HAND
  ASCII DLOG 5002 GET.RESOURCE TO D.HAND
  D.HAND 0 = NOT IF
   D.HAND @ @RECT
   DOWN.SCREEN
   D.HAND @ !RECT
  THEN
  TWEENING.WINDOW On.Activate  DO.TWEEN.PANEL
  TWEENING.WINDOW On.Update UPDATE.TWEENING.WINDOW
   ;


 : DISPLAY.TWEEN.PANEL
   GET.WINDOW >R
   TWEENING.WINDOW ?ACTIVE.WPTR IF
     TWEENING.WINDOW DPUSH
     TWEENING.WINDOW WINDOW
     GET.TWEEN.VARS
     TWEEN.PANEL SET.ITEMS
   THEN
   R> (WINDOW) ;


: DO.VIEW.TWEEN
  CLEAR.REDRAW RE.TOGGLE CLEAR.REDRAW         \ clear the line cursor
  0 DRAW.CHECK !
  OPTION.BITS @ OPTION.VIEW.BIT AND          \ if from object's view
  0 TO ERROR.FLAG
  0 to EXIT.FLAG
  OPTION.BITS @ OPTION.PICS.BIT AND  IF
    INIT.TWEEN.PICS
  THEN
  OPTION.BITS @ OPTION.SCRAP.BIT AND  IF
    INIT.TWEEN.ZSYS
  THEN
  OPTION.BITS @ OPTION.PAINT.BIT AND
    FILE.STYLE 8 =
    FILE.STYLE 9 = OR AND IF
      display.init EXECUTE
```

-000772

```
  THEN
0 SET.CURRENT.KEY
EXIT.FLAG 0=
TWEEN.COUNT @ 0 > AND
TWEEN.FACTOR @ -1 > AND
CURRENT.KEY @ ADJUSTED.KEY.COUNT < AND IF
CURRENT.KEY @ SET.CURRENT.KEY
-1 TO IN.TWEEN?
0 CURRENT.KEY !
BEGIN
  0 TWEEN.FACTOR !
  BEGIN
    TWEEN.WORLD
    DISPLAY.PANEL.TWEEN
    DISPLAY.TWEEN.PANEL
    TWEEN.FACTOR @ 1+ TWEEN.FACTOR !
    ?CMD-PERIOD IF
      -1 TO EXIT.FLAG
    THEN
    ERROR.FLAG
    EXIT.FLAG OR
    TWEEN.FACTOR @ TWEEN.COUNT @ 1- > OR
  UNTIL
  0 TWEEN.FACTOR !
  CURRENT.KEY @ 1+ SET.CURRENT.KEY
  CURRENT.KEY @ KEY.COUNT @ 1- >
  LOOP.TWEEN? @ NOT AND
  ERROR.FLAG     NOT AND
  EXIT.FLAG      NOT AND IF
    TWEEN.WORLD
    DISPLAY.PANEL.TWEEN             \ if not a loop, do end tween
  THEN
  ERROR.FLAG
  EXIT.FLAG OR
  CURRENT.KEY @ ADJUSTED.KEY.COUNT 1- >  OR
UNTIL
0 TO IN.TWEEN?
THEN
DO.ERROR.ALERT
UNDRAW.POLY.CURSOR
0 TWEEN.FACTOR !
DISPLAY.TWEEN.PANEL
OPTION.BITS @ OPTION.VIEW.BIT AND
CURRENT.OBJECT @ WORLD.OBJECT = NOT AND      \ if its object's view and not the world
OPTION.BITS @ OPTION.FAST.BIT AND OR  IF     \ or if we have been rendering fast
  CURRENT.OBJECT @ >R              \ redraw the world
  WORLD.OBJECT SET.CURRENT.OBJECT
  REDRAW.OBJECT
  DISPLAY.WORLD.OUTPUT
  R> SET.CURRENT.OBJECT
  CURRENT.OBJECT @ CHANGED.FLAG !
ELSE
  EFFECT.BITS @  OPTION.SHADOW.BIT AND IF
    DRAW.WORLD.OBJECT.BUFFER
  THEN
THEN  ;


: TWEEN.FAST.VIEW
  OPTION.BITS @
  LOCALS| C.OPTIONS |
  WORLD.OUTPUT ?ACTIVE.WPTR IF
    PAGE
    CLEAR.EDGE
```

-000773

```
  V.TOOL.WIDTH -1          \ display the bounds of the current backport
  ZBUFFERX @ V.TOOL.WIDTH + 1-
    ZBUFFERY @
  FRAME RECTANGLE
  HILITE.V.TOOL
THEN
OPTION.BITS @
OPTION.VIEW.BIT AND
OPTION.FAST.BIT OR
OPTION.BITS !
DO.VIEW.TWEEN
C.OPTIONS OPTION.BITS !  ;
```

```
\ Tweening for the swiv...
\ Last Revision: 01/28/89  03:36:53 PM   YH

cr ." Loading Tweening..."

 ANEW TWEENING2


HEX
  10000 CONSTANT KEY.FRAME.SCALE
   8000 CONSTANT STATE.MASK
   7FFF CONSTANT COUNT.MASK
DECIMAL


CREATE  TWEEN.START.SET?  0 ,
CREATE  TWEEN.END.SET?    0 ,
CREATE  TWEEN.COUNT    10 ,
CREATE  TWEEN.FACTOR    0 ,
CREATE  TWEEN.STYLE  0 ,
CREATE  EASE.OUT 20 ,
CREATE  EASE.IN  20 ,
CREATE  USE.BEZIER.PATH 1 ,


 : 3COSINES                    \ 3 angles -- 3 cosines
   LOCALS| C.YAW C.PITCH C.ROL |
   C.ROL   COS   C.ROL   SIN
   C.PITCH COS      C.PITCH SIN
   C.YAW   COS   C.YAW   SIN  ;


 : SMALL.ANGLE
  0 LOCALS| A.SIGN A.ANGLE
   A.ANGLE 0< TO A.SIGN
   A.ANGLE ABS FULL.ANGLE MOD TO A.ANGLE
   A.ANGLE FULL.ANGLE 2/ > IF
     A.ANGLE FULL.ANGLE  SWAP -
       NEG TO A.ANGLE
     THEN
   A.SIGN IF
     A.ANGLE NEG TO A.ANGLE
   THEN
   A.ANGLE ;


 : KEY.STATE@
   KEY.STATE.COUNT W@
   STATE.MASK AND  ;


 : KEY.STATE!
   LOCALS| THE.STATE THE.REC
   THE.REC KEY.STATE.COUNT W@
   COUNT.MASK AND
   THE.STATE STATE.MASK AND OR
   THE.REC KEY.STATE.COUNT W! ;


 : CURRENT.KEY.RECORD
   OBJECT.ATTRIBUTES1 DROP
   CURRENT.KEY @
   0 MAX KEY.MAX 1- MIN
   KEY.FRAME.RECORD * + ;
```

-000775

```
: NEXT.KEY.RECORD
  OBJECT.ATTRIBUTES1 DROP
  CURRENT.KEY @ 1+
  LOOP.TWEEN? @ IF
    KEY.COUNT @ 1+ MOD
  THEN
  KEY.COUNT @ MIN
  KEY.FRAME.RECORD * +
  DUP  KEY.STATE@ 0= IF
    DROP CURRENT.KEY.RECORD
  THEN ;

: FURTHER.KEY.RECORD
  OBJECT.ATTRIBUTES1 DROP
  CURRENT.KEY @ 2+
  LOOP.TWEEN? @ IF
    KEY.COUNT @ 1+ MOD
  THEN
  KEY.COUNT @ MIN
  0 MAX
  KEY.FRAME.RECORD * +
  DUP KEY.STATE@ 0= IF
    DROP NEXT.KEY.RECORD
  THEN ;

: LAST.KEY.RECORD
  OBJECT.ATTRIBUTES1 DROP
  CURRENT.KEY @ 1-
  LOOP.TWEEN? @ IF
    DUP 0 < IF
      DROP KEY.COUNT @ THEN
  THEN
  KEY.COUNT @ MIN
  0 MAX
  KEY.FRAME.RECORD * +
  DUP KEY.STATE@ 0= IF
    DROP CURRENT.KEY.RECORD
  THEN ;


: KEY.TWEEN.COUNT@
  CURRENT.OBJECT @
  LOCALS| C.OBJECT |
  WORLD.OBJECT SET.CURRENT.OBJECT
  CURRENT.KEY.RECORD
  KEY.STATE.COUNT W@
  COUNT.MASK AND 1 MAX 1000 MIN
  C.OBJECT SET.CURRENT.OBJECT  ;

: KEY.TWEEN.COUNT!
  1 MAX 1000 MIN
  CURRENT.OBJECT @
  LOCALS| C.OBJECT THE.COUNT |
  WORLD.OBJECT SET.CURRENT.OBJECT
  CURRENT.KEY.RECORD KEY.STATE.COUNT W@
  STATE.MASK AND
  THE.COUNT COUNT.MASK AND OR
  CURRENT.KEY.RECORD KEY.STATE.COUNT W!
  C.OBJECT SET.CURRENT.OBJECT  ;


: SET.KEY.OBJECT.FRAME                \ places relative coords in start, norm
```

-000776

```
CURRENT.OBJECT @ 0 > IF
  OBJECT.R3POS  PLUCK
  CURRENT.KEY.RECORD KEY.POSZ !
  CURRENT.KEY.RECORD KEY.POSY !
  CURRENT.KEY.RECORD KEY.POSX !
  OBJECT.RCOS  PLUCK
  ANGLE CURRENT.KEY.RECORD KEY.YAW W!
  ANGLE CURRENT.KEY.RECORD KEY.PITCH W!
  ANGLE CURRENT.KEY.RECORD KEY.ROLL W!
  OBJECT.RSCALE PLUCK
  CURRENT.KEY.RECORD KEY.SCALE !
  CURRENT.KEY.RECORD -1 KEY.STATE!
  OBJECT.CHANGED
THEN ;

: GET.KEY.OBJECT.FRAME                \ places relative coords in start.coords
CURRENT.OBJECT @ 0 >
CURRENT.KEY.RECORD KEY.STATE@ AND IF
  CURRENT.KEY.RECORD KEY.POSX @
  CURRENT.KEY.RECORD KEY.POSY @
  CURRENT.KEY.RECORD KEY.POSZ @
  OBJECT.R3POS  PLACE

  CURRENT.KEY.RECORD KEY.ROLL W@ EXT
  CURRENT.KEY.RECORD KEY.PITCH W@ EXT
  CURRENT.KEY.RECORD KEY.YAW W@ EXT
  3COSINES OBJECT.RCOS PLACE

  CURRENT.KEY.RECORD KEY.SCALE @
  OBJECT.RSCALE PLACE
  OBJECT.CHANGED
THEN ;

: SET.KEY.FRAME                 \ sets tweening start for all objects
CURRENT.OBJECT @ >R              \ save current object
OPERATION @ >R                  \ save current operation
WORLD.OBJECT SET.CURRENT.OBJECT        \ set world as current
TOKEN.FOR SET.KEY.OBJECT.FRAME
 OPERATION !                  \ start object is current operation
TRAVERSE.DOWN.TREE               \ do it down the tree
R> OPERATION !                  \ restore operation
R> SET.CURRENT.OBJECT ;            \ restore current object

: GET.KEY.FRAME                 \ sets tweening start for all objects
CURRENT.OBJECT @ >R              \ save current object
OPERATION @ >R                  \ save current operation
WORLD.OBJECT SET.CURRENT.OBJECT        \ set world as current
TOKEN.FOR GET.KEY.OBJECT.FRAME
 OPERATION !                  \ start object is current operation
TRAVERSE.DOWN.TREE               \ do it down the tree
R> OPERATION !                  \ restore operation
R> SET.CURRENT.OBJECT ;            \ restore current object

: ADD.KEY.OBJECT.FRAME
CURRENT.KEY @
LOCALS| THE.KEY |
THE.KEY 1+ KEY.MAX < IF
  THE.KEY 1+ KEY.MAX 1-  DO
    OBJECT.ATTRIBUTES1 DROP
    I  1- KEY.FRAME.RECORD * -
    OBJECT.ATTRIBUTES1 DROP
    I  KEY.FRAME.RECORD * -
```

-000777

```
    KEY.FRAME.RECORD
      CMOVE
  -1 +LOOP
  THE.KEY CURRENT.KEY !
THEN ;


: ADD.KEY.FRAME
  OPERATION @ CURRENT.OBJECT @
  LOCALS| THE.OBJECT THE.OP
  CURRENT.KEY @  1+ KEY.MAX < IF
    TOKEN.FOR ADD.KEY.OBJECT.FRAME
    OPERATION !
    WORLD.OBJECT SET.CURRENT.OBJECT
    TRAVERSE.DOWN.TREE
    THE.OP OPERATION !
    THE.OBJECT SET.CURRENT.OBJECT
    CURRENT.KEY @ 1+ KEY.MAX 1- MIN
    CURRENT.KEY !
    KEY.COUNT @ 1+ KEY.MAX 1- MIN
    KEY.COUNT !
    SET.KEY.FRAME
    OBJECT.CHANGED
    RESET.UNDO
  else
    10 sysbeep
  then  ;


: DELETE.KEY.OBJECT.FRAME
  CURRENT.KEY @ LOCALS| THE.KEY
  KEY.MAX 1- CURRENT.KEY @ DO
    OBJECT.ATTRIBUTES1 DROP
    I  1+ KEY.FRAME.RECORD * +
    OBJECT.ATTRIBUTES1 DROP
    I  KEY.FRAME.RECORD * +
    KEY.FRAME.RECORD
      CMOVE
  LOOP
  THE.KEY CURRENT.KEY ! ;


: DELETE.KEY.FRAME
  OPERATION @ CURRENT.OBJECT @
  LOCALS| THE.OBJECT THE.OP
  KEY.COUNT @ 0 > IF
    TOKEN.FOR DELETE.KEY.OBJECT.FRAME
    OPERATION !
    WORLD.OBJECT SET.CURRENT.OBJECT
    TRAVERSE.DOWN.TREE
    THE.OP OPERATION !
    THE.OBJECT SET.CURRENT.OBJECT
    KEY.COUNT @ 1- 0 MAX KEY.COUNT !
    CURRENT.KEY @ 1- 0 MAX CURRENT.KEY !
    OBJECT.CHANGED
    RESET.UNDO
  THEN ;


: SHOW.KEY.FRAME
GET.KEY.FRAME
WORLD.OBJECT SET.CURRENT.OBJECT
REDRAW.OBJECT
DISPLAY.WORLD.OUTPUT ;
```

-000778

```
: NEXT.KEY.FRAME
  CURRENT.KEY @
  1+ CURRENT.KEY !
   CURRENT.KEY @ KEY.COUNT @ > IF
    0 CURRENT.KEY !
  THEN SHOW.KEY.FRAME ;

: LAST.KEY.FRAME
  CURRENT.KEY @
  1- CURRENT.KEY !
   CURRENT.KEY @ -1 = IF
    KEY.COUNT @ CURRENT.KEY !
  THEN SHOW.KEY.FRAME ;

: 3SMALL.ANGLE
  LOCALS| C.YAW C.PITCH C.ROL |
  C.ROL   SMALL.ANGLE
  C.PITCH SMALL.ANGLE
  C.YAW   SMALL.ANGLE ;


: ZERO.VECTOR?
  0 LOCALS| ZFLAG |
   0 = TO ZFLAG
   0 = ZFLAG AND TO ZFLAG
   0 = ZFLAG AND
  ;



: LINEAR.KEY.FRAME
  LOCALS| FIX.TWEEN |
  CURRENT.KEY.RECORD KEY.STATE@ IF

    NEXT.KEY.RECORD  KEY.POSX @
    CURRENT.KEY.RECORD KEY.POSX @ -
    FIX.TWEEN KEY.FRAME.SCALE */
    CURRENT.KEY.RECORD KEY.POSX @ -      \ x position linear interpolation

    NEXT.KEY.RECORD  KEY.POSY @
    CURRENT.KEY.RECORD KEY.POSY @ -
    FIX.TWEEN KEY.FRAME.SCALE */
    CURRENT.KEY.RECORD KEY.POSY @ -      \ y position linear interpolation

    NEXT.KEY.RECORD  KEY.POSZ @
    CURRENT.KEY.RECORD KEY.POSZ @ -
    FIX.TWEEN KEY.FRAME.SCALE */
    CURRENT.KEY.RECORD KEY.POSZ @ -      \ z position linear interpolation

    OBJECT.R3POS PLACE             \ set the relative position

    NEXT.KEY.RECORD  KEY.ROLL W@       \ roll attitude interpolation
    CURRENT.KEY.RECORD KEY.ROLL W@ -
    SMALL.ANGLE
    FIX.TWEEN KEY.FRAME.SCALE */ROUND
    CURRENT.KEY.RECORD KEY.ROLL W@ -

    NEXT.KEY.RECORD  KEY.PITCH W@       \ pitch attitude relative interpolation
    CURRENT.KEY.RECORD KEY.PITCH W@ -
    SMALL.ANGLE
    FIX.TWEEN KEY.FRAME.SCALE */ROUND
    CURRENT.KEY.RECORD KEY.PITCH W@ -
```

-000779

```
    NEXT.KEY.RECORD  KEY.YAW W@        \ yaw attitude relative
    CURRENT.KEY.RECORD KEY.YAW W@ -
    SMALL.ANGLE
    FIX.TWEEN KEY.FRAME.SCALE */ROUND
    CURRENT.KEY.RECORD KEY.YAW W@ +

    3COSINES OBJECT.RCOS PLACE         \ set the relative attitude

    NEXT.KEY.RECORD  KEY.SCALE @      \ scale relative interpolation
    CURRENT.KEY.RECORD KEY.SCALE @ -
    FIX.TWEEN KEY.FRAME.SCALE */ROUND
    CURRENT.KEY.RECORD KEY.SCALE @ -
    OBJECT.RSCALE PLACE               \ set the scale
  THEN ;


  \ this computes a bezier segment in one dimension scaled by the
\  fixed point value hex 10000


STRUCTURE bpoint.rec
  LONG: +BPOINTX
  LONG: +BPOINTY
  LONG: +BPOINTZ
STRUCTURE.END

create TIME.POINTS bpoint.rec 4 * ALLOT


HEX


code BezierSeg               \ bpoint.rec, n -- average value
  SAVE.REGS
  D3  pop,              \ D3  is the increment
  a0 pop,               \ a0 are the points
  0 D4 moveq,

   10000 # D2  long move,
  D3  D2  long sub,
  D2  D1 long move,
  D2  D1 mulu,
  0 # d1 word move,
  D1 swap,
  D2  D1 mulu,
  0 # d1 word move,
  D1 swap,              \ D1 is P1 weight
  a0 () D2  long move,
  D1 D2 FIX.RATIO,
  D2 D4 long add,             \ D4 is total

  D3  D1 long move,
  D1 10000 long subi,         \ D1   t - 1.00
  D1 long neg,              \ D1   abs(t- 1.00)
  D1 D1 mulu,
  0 # d1 word move,
  D1 swap,              \ D1   sqr(c0)
  D3  D1 mulu,            \ D1 = t(sqr(t-1.00))
  0 # d1 word move,
  D1 swap,              \ D1 is P2 weight
  D1 D0 LONG MOVE,
  D1 D1 long add,
  D0 D1 long add,             \ D1 * 3
```

-000780

```
bpoint.rec a0 I) D2  long move,
D1 D2 FIX.RATIO,
D2  D4 long add,            \ D4 is total

10000 # D1 long move,         \ curve is symetrical,
D3  D1 long sub,          \ so subtract increment from
D1 D3  exg,             \ 1.00 and use p2 weight

D3  D1 long move,
D1 10000 long subi,         \ D1 = t - 1.00
D1 long neg,            \ D1 = abs(t- 1.00)
D1 D1 mulu,
0 # d1 word move,
D1 swap,              \ D1 - sqr(o0)
D3  D1 mulu,            \ D1 = t(sqr(t-1.00))
0 # d1 word move,
D1 swap,              \ D1 is P3 weight
D1 D0 LONG MOVE,
D1 D1 long add,
D0 D1 long add,           \ D1 * 3
bpoint.rec 2* a0 I) D2  long move,
D1 D2 FIX.RATIO,
D2  D4 long add,            \ D4 is total

10000 # D2  long move,
D3  D2  long sub,
D2  D1 long move,
D2  D1 mulu,
0 # d1 word move,
D1 swap,
D2  D1 mulu,
0 # d1 word move,
D1 swap,              \ D1 is P4 weight
bpoint.rec 3 * a0 I) D2  long move,
D1 D2 FIX.RATIO,
D2  D4 long add,            \ D4 is total
D4 push,
RESTORE.REGS
next end-code

DECIMAL


STRUCTURE BEZIER.POINT
  LONG: C1.POINTX
  LONG: C1.POINTY
  LONG: C1.POINTZ
  LONG: B.POINTX
  LONG: B.POINTY
  LONG: B.POINTZ
  LONG: C2.POINTX
  LONG: C2.POINTY
  LONG: C2.POINTZ
STRUCTURE.END

: T*/
  DUP 0= IF 2DROP DROP 0 ELSE */ THEN ;

CREATE BEZIER.ARRAY  4 BEZIER.POINT * ALLOT

HEX
```

```
  : SET.CONTROLS.POINTS
    0 0 0 0 0 LOCALS| HYP1 HYP2 ZDIFF XDIFF YDIFF B.ARRAY

    B.ARRAY BEZIER.POINT + B.POINTX @        \ find the differences
    B.ARRAY BEZIER.POINT - B.POINTX @ -
    TO XDIFF
    B.ARRAY BEZIER.POINT + B.POINTY @
    B.ARRAY BEZIER.POINT - B.POINTY @ -
    TO YDIFF
    B.ARRAY BEZIER.POINT + B.POINTZ @
    B.ARRAY BEZIER.POINT - B.POINTZ @ -
    TO ZDIFF

    B.ARRAY BEZIER.POINT - B.POINTX @        \ calculate first hypot.
    B.ARRAY B.POINTX @ - -10 SCALE DUP *
    B.ARRAY BEZIER.POINT - B.POINTY @
    B.ARRAY B.POINTY @ - -10 SCALE DUP * +
    B.ARRAY BEZIER.POINT - B.POINTZ @
    B.ARRAY B.POINTZ @ - -10 SCALE DUP * +
    SQRT TO HYP1

    B.ARRAY BEZIER.POINT + B.POINTX @        \ calculate first hypot.
    B.ARRAY B.POINTX @ - -10 SCALE DUP *
    B.ARRAY BEZIER.POINT + B.POINTY @
    B.ARRAY B.POINTY @ - -10 SCALE DUP * +
    B.ARRAY BEZIER.POINT + B.POINTZ @
    B.ARRAY B.POINTZ @ - -10 SCALE DUP * +
    SQRT TO HYP2

    HYP1 10000 HYP1 HYP2 + T*/ 3
    HYP2 10000 HYP1 HYP2 + T*/ 3 /
    TO HYP2 TO HYP1                  \ hypots are now scales

    B.ARRAY B.POINTX @ XDIFF HYP1 10000 T*/ -
    B.ARRAY C1.POINTX !
    B.ARRAY B.POINTY @ YDIFF HYP1 10000 T*/ -
    B.ARRAY C1.POINTY !
    B.ARRAY B.POINTZ @ ZDIFF HYP1 10000 T*/ -
    B.ARRAY C1.POINTZ !                \ set control point1

    B.ARRAY B.POINTX @ XDIFF HYP2 10000 T*/ +
    B.ARRAY C2.POINTX !
    B.ARRAY B.POINTY @ YDIFF HYP2 10000 T*/ +
    B.ARRAY C2.POINTY !
    B.ARRAY B.POINTZ @ ZDIFF HYP2 10000 T*/ -
    B.ARRAY C2.POINTZ ! ;              \ set control point2

DECIMAL


    : TRANS/SCALE.COS
      LOCALS| LDEST WSOURCE
      WSOURCE W@    EXT SMALL.ANGLE 10 SCALE  LDEST !
      WSOURCE 2+ W@ EXT SMALL.ANGLE 10 SCALE  LDEST 4 + !
      WSOURCE 4+ W@ EXT SMALL.ANGLE 10 SCALE  LDEST 8 + ! ;


    : MIN.TRANS/SCALE.COS
      0 LOCALS| TEMP.ANGLE LDEST WSOURCE
      LDEST BEZIER.POINT - @
      -10 SCALE TO TEMP.ANGLE
      WSOURCE W@ EXT
      TEMP.ANGLE - SMALL.ANGLE
      TEMP.ANGLE + 10 SCALE  LDEST !
```

```
      LDEST BEZIER.POINT - 4+ @
      -10 SCALE TO TEMP.ANGLE
      WSOURCE 2- W@ EXT
      TEMP.ANGLE - SMALL.ANGLE
      TEMP.ANGLE + 10 SCALE LDEST 4 - !
      LDEST BEZIER.POINT - 8+ @
      -10 SCALE TO TEMP.ANGLE
      WSOURCE 4+ W@ EXT
      TEMP.ANGLE - SMALL.ANGLE
      TEMP.ANGLE + 10 SCALE LDEST 8 - ! ;


    : TRANS.SPAWN.SCALE
      LOCALS| LDEST THE.SCALE |
      THE.SCALE  LDEST !
      THE.SCALE  LDEST 4- !
      THE.SCALE  LDEST 8 + ! ;


    : 10RoundScale
      DUP 0< IF
        512 -
      ELSE
        512 +
      THEN
       -10 SCALE ;


: BEZIER.KEY.FRAME
  LOCALS| FIX.TWEEN |
  FIX.TWEEN KEY.FRAME.SCALE   IF
    CURRENT.KEY @ 1+
    LOOP.TWEEN? @ IF
    DUP KEY.COUNT @ > IF
      DROP 0 THEN
    THEN
    KEY.COUNT @ MIN
    CURRENT.KEY !
    GET.KEY.OBJECT.FRAME
  ELSE
    FIX.TWEEN 0 = IF
      GET.KEY.OBJECT.FRAME
    ELSE
      LAST.KEY.RECORD KEY.POSX
      BEZIER.ARRAY B.POINTX 12 CMOVE

      CURRENT.KEY.RECORD KEY.POSX
      BEZIER.ARRAY BEZIER.POINT -
      B.POINTX 12 CMOVE

      NEXT.KEY.RECORD KEY.POSX
      BEZIER.ARRAY BEZIER.POINT 2* -
      B.POINTX 12 CMOVE

      FURTHER.KEY.RECORD KEY.POSX
      BEZIER.ARRAY BEZIER.POINT 3 * -
      B.POINTX 12 CMOVE

      BEZIER.ARRAY BEZIER.POINT - SET.CONTROLS.POINTS
      BEZIER.ARRAY BEZIER.POINT 2* - SET.CONTROLS.POINTS


      BEZIER.ARRAY BEZIER.POINT - B.POINTX
      FIX.TWEEN BEZIERSEG
```

```
BEZIER.ARRAY BEZIER.POINT - B.POINTY
FIX.TWEEN BEZIERSEG

BEZIER.ARRAY BEZIER.POINT - B.POINTZ
FIX.TWEEN BEZIERSEG

OBJECT.R3POS PLACE

LAST.KEY.RECORD KEY.ROLL
BEZIER.ARRAY
B.POINTX TRANS/SCALE.COS

CURRENT.KEY.RECORD KEY.ROLL
BEZIER.ARRAY BEZIER.POINT +
B.POINTX MIN.TRANS/SCALE.COS

NEXT.KEY.RECORD KEY.ROLL
BEZIER.ARRAY BEZIER.POINT 2 * -
B.POINTX MIN.TRANS/SCALE.COS

FURTHER.KEY.RECORD KEY.ROLL
BEZIER.ARRAY BEZIER.POINT 3 * -
B.POINTX MIN.TRANS/SCALE.COS

BEZIER.ARRAY BEZIER.POINT -      SET.CONTROLS.POINTS
BEZIER.ARRAY BEZIER.POINT 2 * - SET.CONTROLS.POINTS

BEZIER.ARRAY BEZIER.POINT - B.POINTX
FIX.TWEEN BEZIERSEG 10RoundScale

BEZIER.ARRAY BEZIER.POINT - B.POINTY
FIX.TWEEN BEZIERSEG 10RoundScale

BEZIER.ARRAY BEZIER.POINT - B.POINTZ
FIX.TWEEN BEZIERSEG 10RoundScale

3COSINES OBJECT.RCOS PLACE          \ set the relative attitude


LAST.KEY.RECORD KEY.SCALE @
BEZIER.ARRAY B.POINTX TRANS.SPAWN.SCALE

CURRENT.KEY.RECORD  KEY.SCALE @
BEZIER.ARRAY BEZIER.POINT +
B.POINTX TRANS.SPAWN.SCALE

NEXT.KEY.RECORD  KEY.SCALE @
BEZIER.ARRAY BEZIER.POINT 2* -
B.POINTX TRANS.SPAWN.SCALE

FURTHER.KEY.RECORD  KEY.SCALE @
BEZIER.ARRAY BEZIER.POINT 3 * +
B.POINTX TRANS.SPAWN.SCALE

BEZIER.ARRAY BEZIER.POINT - SET.CONTROLS.POINTS
BEZIER.ARRAY BEZIER.POINT 2* - SET.CONTROLS.POINTS


BEZIER.ARRAY BEZIER.POINT - B.POINTX
FIX.TWEEN BEZIERSEG
OBJECT.RSCALE PLACE
OBJECT.CHANGED
THEN
```

-000784

```
THEN ;

: ADJUSTED.KEY.COUNT
  KEY.COUNT @
  LOOP.TWEEN? @ IF
    1 -
  THEN ;

: SMOOTH.TIME.BASE
  LOCALS| FIX.TWEEN |          \ fix.tween -- smoothed fix.tween
  FIX.TWEEN KEY.FRAME.SCALE =
  CURRENT.KEY @ 0 =
  CURRENT.KEY @ ADJUSTED.KEY.COUNT 1- = OR NOT OR
  IF
    FIX.TWEEN
  ELSE
    0 TIME.POINTS !            \ first point is zero
    KEY.FRAME.SCALE 3 /
    TIME.POINTS BPOINT.REC + !
    KEY.FRAME.SCALE 3 / 2*
    TIME.POINTS BPOINT.REC 2* + !
    KEY.FRAME.SCALE
    TIME.POINTS BPOINT.REC 3 * + !      \ last point is tween scale
    CURRENT.KEY @ 0 > IF
      100 EASE.IN @ -
      KEY.FRAME.SCALE 3 / 100 */
      TIME.POINTS BPOINT.REC + !     \ second points is controlled by ease in
    THEN
    CURRENT.KEY @ ADJUSTED.KEY.COUNT 1- < IF
      100 EASE.OUT @ -
      KEY.FRAME.SCALE 3 / 100 */
      KEY.FRAME.SCALE SWAP -
      TIME.POINTS BPOINT.REC 2* + !     \ third point is controlled by ease out
    THEN
      TIME.POINTS FIX.TWEEN
    BezierSeg                 \ scale for roundoff error
  THEN
  ;

: INSTANCE.TWEEN.OBJECT
  0 LOCALS| FIX.TWEEN |
  CURRENT.KEY.RECORD KEY.STATE@ IF
    TWEEN.FACTOR @
    KEY.FRAME.SCALE
    TWEEN.COUNT @ */
    TO FIX.TWEEN
    FIX.TWEEN SMOOTH.TIME.BASE TO FIX.TWEEN
    USE.BEZIER.PATH @ IF
      FIX.TWEEN BEZIER.KEY.FRAME
    ELSE
      FIX.TWEEN LINEAR.KEY.FRAME
    THEN
  THEN ;

: TWEEN.WORLD
  TWEEN.FACTOR @ TWEEN.COUNT @ > NOT
  IF
  CURRENT.OBJECT @ >R
  WORLD.OBJECT SET.CURRENT.OBJECT
```

```
OPERATION @ >R
TOKEN.FOR INSTANCE.TWEEN.OBJECT OPERATION !
TRAVERSE.DOWN.TREE
R> OPERATION !
R> SET.CURRENT.OBJECT
THEN ;


: DISPLAY.TWEENING                    \ draws world from absolute object info
CURRENT.OBJECT @
LOCALS| C.OBJECT |
OPTION.BITS @  OPTION.FAST.BIT AND IF
  WORLD.OBJECT SET.CURRENT.OBJECT
  SET.ABSOLUTE
  DISPLAY.WORLD.CURSOR
  -1 DRAW.CHECK !
ELSE
  OPTION.BITS @  OPTION.PAINT.BIT AND IF      \ if paint bit is on ...
    FILE.STYLE 1 =               \ if routines require redrawing...
    FILE.STYLE 9 = OR NOT IF
      DO.EFFECTS.RENDER
    THEN
    WriteOutput
  ELSE
    DO.EFFECTS.RENDER
  THEN
  OPTION.BITS @  OPTION.SCRAP.BIT AND IF      \ if paint bit is on ...
    SCRAP.SAVE EXECUTE              \ write the scrap file
  THEN
  OPTION.BITS @  OPTION.PICS.BIT AND IF       \ if paint bit is on ...
    PICS.SAVE EXECUTE               \ write the pics file
  THEN
  DISPLAY.WORLD.OUTPUT
THEN
C.OBJECT SET.CURRENT.OBJECT ;


: SET.CURRENT.KEY
CURRENT.KEY !
KEY.TWEEN.COUNT@
TWEEN.COUNT !  ;


: DO.CURSOR.TWEEN
  CURRENT.OBJECT @ >R
  WORLD.OBJECT SET.CURRENT.OBJECT
    ADJUSTED.KEY.COUNT  0 DO
    I SET.CURRENT.KEY
      TWEEN.COUNT @  0 DO
      I TWEEN.FACTOR !
      TWEEN.WORLD
       SET.ABSOLUTE
      DISPLAY.WORLD.CURSOR
    LOOP
  LOOP
  R> SET.CURRENT.OBJECT ;
```

```
ANEW V.TOOLS

CR ." LOADING V.TOOLS "

 \ TOOL CONSTANTS
   1 CONSTANT XY.ARROW
   2 CONSTANT ZY.ARROW
   3 CONSTANT YAW.ARROW
   4 CONSTANT PITCH.ARROW
   5 CONSTANT ROL.ARROW
   6 CONSTANT SCALE.TOOL
   7 CONSTANT BLOCK.TOOL
   8 CONSTANT EXTRUSION.TOOL
   9 CONSTANT LINK.TOOL
  10 CONSTANT LOCK.TOOL
  11 CONSTANT BLINK.TOOL
  12 CONSTANT UNLINK.TOOL
  13 CONSTANT ZOOM.IN.TOOL
  14 CONSTANT ZOOM.OUT.TOOL
  15 CONSTANT OBJECT.PALETTE

  OBJECT.PALETTE ' #V.TOOLS !

  0  0  #V.TOOLS V.TOOL.HEIGHT *  V.TOOL.WIDTH   V.TOOL.BOX !RECT


 : IN.V.TOOLS?          \ -- RETURNS FALSE OR V.TOOL NUMBER
  @MOUSE.DN DUP
  V.TOOL.BOX PTINRECT IF
  POINT>XY SWAP DROP
  V.TOOL.HEIGHT / 1 +
  ELSE DROP 0 THEN ;


 : WHICH.V.TOOL?          \ -- RETURNS  V.TOOL NUMBER
  @MOUSE.DN
  POINT>XY SWAP DROP
  V.TOOL.HEIGHT / 1 +
  1 MAX
  #V.TOOLS MIN ;



 : DISPLAY.V.TOOLS        \ DISPLAYS V.TOOL PALETTE
  ASCII PICT
  V.TOOL.PICT
  GET.RESOURCE
  DUP IF
      DUP @ 2+ @RECT
        ROT  -  V.TOOLS.RECT 6 + W!
        SWAP -  V.TOOLS.RECT 4 + W!
        V.TOOLS.RECT DRAW.PICTURE
  ELSE DROP THEN ;

 : (HILITE.V.TOOL)        \ N -- HILITES TOOL
  1- V.TOOL.HEIGHT *
  DUP>R
  0 SWAP
  V.TOOL.WIDTH
  R> V.TOOL.HEIGHT +
  INVERT RECTANGLE ;
```

-000787

```
: HILITE.V.TOOL
  DISPLAY.V.TOOLS
  CURRENT.V.TOOL @
  (HILITE.V.TOOL) ;


 : DO.V.TOOLS
 0 LOCALS| HIT.TOOL |
 IN.V.TOOLS? IF
   BEGIN
     WHICH.V.TOOL? TO HIT.TOOL
     HIT.TOOL  CURRENT.V.TOOL @ = NOT IF
        HIT.TOOL 1 MAX
        CURRENT.V.TOOL !
        HILITE.V.TOOL
       THEN
   MOUSE.BUTTON NOT UNTIL
 THEN ;

  : SHIFT.LOCK.DOWN
      EVENT.RECORD MODIFY 8 AND 8   ;


 : REVERT.V.TOOL
   SHIFT.LOCK.DOWN NOT IF
     DEFAULT.V.TOOL @       \ set default tool current
       CURRENT.V.TOOL !
     HILITE.V.TOOL
   THEN ;

  : TEST.V.TOOLS 8 textmode
  HILITE.V.TOOL
  BEGIN  MOUSE.BUTTON IF
      DO.V.TOOLS 200 200 move.to .s THEN AGAIN ;

 : DISPOSE.CLIP
   DUP PURGABLE DISPOSE.REGION ;
```

```
\ VIEWER IS MAIN LOOP FOR WINDOW

CR  ." Loading Viewer ... "

\  undo move includes undo for scroll

 : UNDO.MOVE
    UNDO.CHANGE
   GET.OBJECT
    REDRAW.OBJECT
   GET.WINDOW WORLD.OUTPUT = IF
    CURRENT.OBJECT @ WORLD.OBJECT = IF
      SET.SCROLL
    THEN
   THEN
     DISPLAY.WORLD.OUTPUT  ;


  find UNDO.MOVE ' ^UNDO.MOVE !


\ TOOLS FOR NEW OBJECTS

 : DO.BLOCK
  CLEAR.MOVING                \ clear moving objects
  RESET.UNDO
  NEW.OBJECT
  CURRENT.OBJECT @  WORLD.OBJECT >  IF
    ^DELETE.OBJECT UNDO.TOKEN !
    "UNDO.NEW SET.UNDOS
    CURRENT.OBJECT @ DUP UN.OBJECT !
    MOST.CURRENT !
    FRONT.CAP.BIT
    BACK.CAP.BIT OR
    OBJECT.FORM.RENDER PLACE
    LATHE.FORM.EDIT OBJECT.FORM.EDIT PLACE
    90 ANGLE.SCALE *  YAW C PITCH C ROL
    COSINES OBJECT.ACOS MOVE.RECORD
      @MOUSE.DN POINT>XY
      2>3POS
    OBJECT.A3POS PLACE
    SET.RELATIVE
    DRAW.OBJECT
      DISPLAY.WORLD.OUTPUT
    REVERT.V.TOOL        \ revert if caps lock is up

   ELSE
    WORLD.OBJECT SET.CURRENT.OBJECT
   THEN ;


  : DO.EXTRUSION
   CLEAR.MOVING                \ clear moving objects
   RESET.UNDO
   NEW.OBJECT
   CURRENT.OBJECT @  WORLD.OBJECT >  IF
     ^DELETE.OBJECT UNDO.TOKEN !
     "UNDO.NEW SET.UNDOS
     CURRENT.OBJECT @ DUP UN.OBJECT !
     MOST.CURRENT !
     FRONT.CAP.BIT
     BACK.CAP.BIT OR
     OBJECT.FORM.RENDER PLACE
     EXTRUSION.FORM.EDIT OBJECT.FORM.EDIT PLACE
```

-000789

```
    0 YAW 0 PITCH 0 ROL
    COSINES OBJECT.ACOS MOVE.RECORD
      @MOUSE.DN POINT>XY
      2>3POS
    OBJECT.A3POS PLACE
    SET.RELATIVE
    GET.OBJECT
    DEFAULT.TRIANGLE
    DEFAULT.EXT.RECT
    PUT.OBJECT
    DRAW.OBJECT
      DISPLAY.WORLD.OUTPUT
    REVERT.V.TOOL        \ revert if caps lock is up
  ELSE
    WORLD.OBJECT SET.CURRENT.OBJECT
  THEN ;


\ to draw all the windows in event of resized backport, or color change



NULL.TOKEN CONSTANT OBJECT.DRAWING.TOKEN
VARIABLE DEFAULT.CLOSE 0 ,


  : STACK.MINDER
  MY.DEBUG @ IF
    10 10 MOVE.TO .S
  THEN ;

 0 constant ^REFRESH.VIEW


  : CLEAR.EDGE
  SET.FULL.CLIP
  V.TOOL.WIDTH   ZBUFFERY @          DISPLAY THE BOUNDS OF THE CURRENT BACKPORT
  2000 2000 WHITE PATTERN RECTANGLE
  ZBUFFERX @ V.TOOL.WIDTH + 1- 0
  2000 2000 WHITE PATTERN RECTANGLE
   0 #V.TOOLS V.TOOL.HEIGHT * 1-
  V.TOOL.WIDTH 2000
  WHITE PATTERN  RECTANGLE  ;


  : DRAW.WINDOW.PICT
    WINDOW.PICT @ 0> IF
      8 PENMODE
      WINDOW.PICT @ @ 2- @RECT
      TEMP.RECT !RECT
      V.TOOL.WIDTH  0
        TEMP.RECT
      MAKE.OFFSET.RECT
      WINDOW.PICT @ SWAP
      DRAW.PICTURE
      V.TOOL.WIDTH -1         \ display the bounds of the current backport
      ZBUFFERX @ V.TOOL.WIDTH + 1-
        ZBUFFERY @
      FRAME RECTANGLE
    THEN  ;

  : MAKE.WINDOW.PICT
```

```
  0 LOCALS| C.PICT |
  WINDOW.PICT @ 0 > IF
    WINDOW.PICT @ DISPOSE.PICTURE
    0 WINDOW.PICT !
  THEN
  ^POLY.BITS @ 0> IF
    BACK.BITS  6+ @RECT
    TEMP.RECT !RECT
    ENTER.CURRENT.BACKPORT
    SAVE.CLIP >R
    TEMP.RECT CLIP.RECT
    BACK.BITS 6 + OPEN.PICTURE
    TO C.PICT              \ open the picture
      BACK.BITS            \ blit from itself to itself
      GET.WINDOW 2+
          BACK.BITS  6 + DUP        \ use the calculated rect
        0 0 COPY.BITS         \ do the copy
        CLOSE.PICTURE         \ close the picture
    R> RESTORE.CLIP
    EXIT.CURRENT.BACKPORT
  THEN
  C.PICT WINDOW.PICT ! ;


: DISPLAY.BACKPORT
BACK.FLAG @ IF
  DRAW.WINDOW.PICT
  FALSE BACK.FLAG !
  WINDOW.PICT @ 0 > IF
    WINDOW.PICT @ DISPOSE.PICTURE
    0 WINDOW.PICT !
  THEN
ELSE
  DISPLAY.WORLD
THEN ;


: REFRESH.VIEW
   CURRENT.OUTPUT.WINDOW
  LOCALS| C.WINDOW |
  #WINDOWS 0 DO
    I TO CURRENT.OUTPUT.WINDOW
    WORLD.OUTPUT ?ACTIVE.WPTR IF
      GET.WINDOW WORLD.OUTPUT = IF
        CLEAR.EDGE
        HILITE.V.TOOL
        BACK.FLAG @ IF
          DRAW.WINDOW.PICT
        ELSE
          DISPLAY.WORLD
        THEN
      THEN
    THEN
  LOOP
 C.WINDOW TO CURRENT.OUTPUT.WINDOW  ;

 FIND REFRESH.VIEW '  ^REFRESH.VIEW !


 : REDRAW.CHANGED.OBJECTS
 CHANGED.FLAG @ UEXT META.WORLD > IF        \ test the changed flag
   DISPLAY.BACKPORT
   CHANGED.FLAG @ UEXT SET.CURRENT.OBJECT     \ set changed object to current
   GET.OBJECT                      \ fetch the changed object
```

-000791

```
  OBJECT.STATE PLUCK IF               \ if object is active
    CHANGED.FLAG @
    TREE.CHANGED AND IF               \ test for tree change ...
      REDRAW.OBJECT                   \ redraw the tree
    THEN
    CHANGED.FLAG @
    JUST.OBJECT.CHANGED  AND  IF      \ test for object change...
      REDRAW.JUST.ONE                 \ redraw the object
    THEN
  THEN
  0 CHANGED.FLAG !                    \ reset the changed flag
THEN
DISPLAY.BACKPORT ;

: SET.VIEW.OFFSET
ZBUFFERX @ XVIEWNORMAL @ SCALE.RANGE */
  XOFFSET !
XOFFSET @ 1-  NEG FIX.SCALE SCALE
LEFTPLANE !
ZBUFFERX @ XOFFSET @ 1- - FIX.SCALE SCALE
RIGHTPLANE !
ZBUFFERY @ YVIEWNORMAL @ SCALE.RANGE */
YOFFSET !                     \ set offsets for display
  YOFFSET @ 1- NEG FIX.SCALE SCALE
TOPPLANE !
ZBUFFERY @ YOFFSET @ 2 - - FIX.SCALE SCALE
BOTTOMPLANE ! ;


: INIT.VIEW                     \ initializes viewer window
SET.CURRENT.WINDOW                  \ set current.output window to this window
SET.FULL.CLIP                   \ set the clipping region to full window with scrolls
SET.VIEW.OFFSET
CLEAR.REDRAW                    \ clear redraw buffer for line cursors
RE.TOGGLE
CLEAR.REDRAW
1 DRAW.CHECK !                    \ set draw check to redraw
  0 0 XYOFFSET                    \ set forth window offsets to zero
  SET.VIEW.LIMITS                  \ set poly drawing and line drawing clip [illegible]
SCRATCH.TOKEN @ EXECUTE              \ init the scratch file
ZBUFFER.EXISTS?
0 ?HEAP.SIZE MINHEAPSIZE <
OR IF
  0 IN.OBJECT.DRAWING !                 \ check memory size
  SET.START.BACKPORTS
  WORLD.OBJECT SET.CURRENT.OBJECT
  REDRAW.OBJECT
THEN
OUTPUT.DEPTH @                    \ check for change in bitmap depth
LAST.DEPTH @ = NOT IF                 \ if not the same as last time ...
  0 IN.OBJECT.DRAWING !               \ reset
  INIT.BACK.PORT
  INIT.WINDOW.PALETTE
  WORLD.OBJECT SET.CURRENT.OBJECT
  REDRAW.OBJECT
THEN
MENU.ON.TOKEN EXECUTE
EVENTS ON  ;


: WORLD.EDIT.TOOLS
    CURRENT.V.TOOL @  CASE
            XY.ARROW    OF  ^OBJECT.CURSORS ^PROTO.TOOL !
```

-000792

```
            PROTO.TOOL        ENDOF

      ZY.ARROW    OF  ^OBJECT.CURSORS ^PROTO.TOOL !
            PROTO.TOOL       ENDOF

      YAW.ARROW OF  ^NIL.ATTITUDE ^Y.ATTITUDE !
            ^YAW.UPDATE ^X.ATTITUDE !
            ^NIL.KEY ^ATT.KEY !
            ^ATT.POLY.CURSOR ^PROTO.TOOL !
            PROTO.TOOL     ENDOF

      PITCH.ARROW OF  ^PITCH.UPDATE ^Y.ATTITUDE !
            ^NIL.ATTITUDE ^X.ATTITUDE !
            ^NIL.KEY ^ATT.KEY !
            ^ATT.POLY.CURSOR ^PROTO.TOOL !
            PROTO.TOOL     ENDOF

      ROL.ARROW OF  ^ROL.UPDATE ^Y.ATTITUDE !
            ^NIL.ATTITUDE ^X.ATTITUDE !
            ^NIL.KEY ^ATT.KEY !
            ^ATT.POLY.CURSOR ^PROTO.TOOL !
             PROTO.TOOL  ENDOF

      SCALE.TOOL  OF  ^SCALE.TOOL ^PROTO.TOOL !
             PROTO.TOOL  ENDOF

      BLOCK.TOOL  OF  DO.BLOCK    ENDOF

      EXTRUSION.TOOL
           OF  DO.EXTRUSION ENDOF

            LINK.TOOL    OF  ALL.FREE
            DUP
            GLOBAL.LINK W!
            CURRENT.LINK W!
            DO.LINK          ENDOF

      UNLINK.TOOL OF  UNLINKER       ENDOF


      LOCK.TOOL   OF  ALL.LOCK  DUP
            GLOBAL.LINK W!
            CURRENT.LINK W!
            DO.LINK      ENDOF

      BLINK.TOOL  OF  POSITION.LOCK  DUP
            GLOBAL.LINK W!
            CURRENT.LINK W!
            DO.LINK      ENDOF
      ZOOM.IN.TOOL   OF
            ZOOM.IN.RECT
            SET.SCROLL
            REVERT.V.TOOL    ENDOF
      ZOOM.OUT.TOOL  OF
            ZOOM.OUT.RECT
            SET.SCROLL
            REVERT.V.TOOL    ENDOF
      OBJECT.PALETTE OF
           DO.PALETTE  ENDOF
      ENDCASE  ;

: VIEWER.CLOSE.BOX             \ replaces default event handler
EVENT.RECORD 2+ @ WORLD.OUTPUT
```

-000793

```
IF
  WORLD.OUTPUT MOUSE.WAS..
  TRACK.GO.AWAY
    IF CLOSE.WORLD THEN
ELSE DEFAULT.CLOSE @ EXECUTE
THEN ;

: INIT.VIEW.CLOSE
    EVENT.TABLE IN.CLOSE.BOX 2* - W@  DEFAULT.CLOSE !
    TOKEN.FOR VIEWER.CLOSE.BOX
  EVENT.TABLE IN.CLOSE.BOX 2* - W! ;


: INIT.WORLD.EDIT
  MENU.ON.TOKEN EXECUTE
  SET.OUTPUT.TITLE
  SET.SCROLL
  SET.VIEW.LIMITS                 \ set poly drawing and line drawing clip vars
  INIT.CURSOR
    SHOW.CURSOR
  SET.DEFAULT.TOOL
  REVERT.V.TOOL
  ^REFRESH.VIEW
  GET.WINDOW  +ON.UPDATE W!
  TOKEN.FOR VIEWER.CLOSE.BOX
  EVENT.TABLE IN.CLOSE.BOX 2* - W!
  0 INIT.FLAG !
  CLEAR.EDGE
  HILITE.V.TOOL
  REDRAW.CHANGED.OBJECTS ;


NULL.TOKEN CONSTANT ^DO.PALETTE.CLICKS

: DO.TOOL.CLICKS
  IN.V.TOOLS? IF
    WHICH.V.TOOL?
    CASE
      OBJECT.PALETTE OF
        ^DO.PALETTE.CLICKS EXECUTE
      ENDOF
    ENDCASE
  THEN ;


: DO.WORLD.EDIT
  INIT.FLAG @ IF
    INIT.WORLD.EDIT
  THEN
  inBackGround @ not if
    FLASH.SELECTED
  then
  DO.EVENTS
  ^DoEditorEvents execute          \ handle external editors
  inBackGround @ if
    drop
   else
     HANDLE.KEYS
     DUP IN.SIZE.BOX  = IF SET.WINDOW.LIMITS THEN
     DUP IN.DRAG.BOX  = IF SET.WINDOW.LIMITS THEN
     DUP IN.ZOOM.OUT  = IF SET.WINDOW.LIMITS THEN
     DUP IN.ZOOM.IN   = IF SET.WINDOW.LIMITS THEN
```

-000794

```
    DUP UPDATE.EVENT = IF CHECK.RES.FILE THEN
    DOUBLE.CLICK IF
      @MOUSE.DN POINT>XY OUTSIDE.BOUNDS NOT IF
        @MOUSE.DN POINT>XY
        SELECT.OBJECT? IF
          Object.Form.Edit pluck 3 < if
              OBJECT.FORM PLUCK CASE
              PATH.FORM OF
                -1 IN.OBJECT.DRAWING !
                -1 INIT.FLAG !  ENDOF
              MESH.FORM OF
                -2 IN.OBJECT.DRAWING !
                -1 INIT.FLAG !  ENDOF
            ENDCASE
          else
            Object.Form.Edit pluck ^DoXEditor execute     \ launch external editors
          then
        THEN
      THEN
      DO.TOOL.CLICKS
    THEN
    MOUSE.DOWN = IF
      DO.CONTROLS
      DO.V.TOOLS
      SET.V.CURSORS
      @MOUSE.DN POINT>XY OUTSIDE.BOUNDS NOT IF
              WORLD.EDIT.TOOLS
      THEN
      ^SETUP.OBJECT.MENU EXECUTE          \ be sure menus are set for command keys
    THEN
  then ;


: VIEWER
  IF
    WINDOW.REGION.EMPTY
    INIT.VIEW
    -1 INIT.FLAG !            \ for inits in loop
    BEGIN
      IN.OBJECT.DRAWING @
      CASE
         0 OF DO.WORLD.EDIT ENDOF

        -1 OF DO.OBJECT.DRAWING ENDOF

        -2 OF DO.OBJECT.MESH
          ENDOF
      ENDCASE
    AGAIN
  ELSE
    IN.OBJECT.DRAWING @ CASE
      -1 OF                \ if object drawing...
        PUT.OBJECT.DRAWING
        ^DISPLAY.QUADS
        WORLD.OUTPUT +ON.UPDATE W!
      ENDOF
      -2 OF                \ if plot drawing...
        ^DISPLAY.QUADS
        WORLD.OUTPUT +ON.UPDATE W!
      ENDOF
    ENDCASE
    CURRENT.OBJECT @ CHANGED.FLAG !
    MENU.OFF.TOKEN EXECUTE
```

-000795

```
    RESET.UNDO
    DA.EDIT.MENU
    TOKEN.FOR VIEWER.CLOSE.BOX        \ reset the close box token
    EVENT.TABLE IN.CLOSE.BOX 2* + W!
  THEN ;
```

```
CR

." Loading window stuff..."

  ANEW WINDOW.STUFF


NEW.WINDOW HIDDEN.WIN


: SCREEN.SIZE.WINDOW
  SCREEN.BOUNDS @RECT
  LOCALS| WRIGHT WBOTTOM WLEFT WTOP THE.WPTR |
  WTOP 40 +
  WLEFT 5 +
  WBOTTOM 10 -
    WTOP 40 - ZBUFFERY @ + SCROLL.WIDTH - 2 - MIN
    WTOP 40 + V.TOOL.HEIGHT #V.TOOLS * - SCROLL.WIDTH - MAX   \ big enough for tools
  WRIGHT 50 -
    WLEFT 5 + ZBUFFERX @ + SCROLL.WIDTH - V.TOOL.WIDTH - 2 - MIN
  THE.WPTR +WBOUNDS !RECT ;


: CENTER.WINDOW  ( wptr --   use before ADD.WINDOW )
  locals| THE.WPTR |
  the.wptr +wbounds @rect center.on.screen
  the.wptr +wbounds !rect ;


 : RESET.VIEW
   INIT.WINDOW.ARRAY
   ROM85 W@ MACII > IF
  " B&W "      WORLD.OUTPUT  W.TITLE
  SIZE.BOX
  SCROLL.UP/DOWN    +
  SCROLL.LEFT/RIGHT -
  CLOSE.BOX +
  ZOOM.BOX +  WORLD.OUTPUT  W.ATTRIBUTES
   THEN
   " Untitled"  WORLD.OUTPUT  W.TITLE
   WORLD.OUTPUT ON.UPDATE   REFRESH.VIEW
   WORLD.OUTPUT ON.ACTIVATE VIEWER
   WORLD.OUTPUT SCREEN.SIZE.WINDOW
   WORLD.OUTPUT ADD.WINDOW
   WORLD.OUTPUT WINDOW  OUTFILE ON
   GINIT                  \ for forth graphics
   SET.WINDOW.LIMITS ;


 : INIT.NEW.WINDOW
    ROM85 W@ MACII > IF
      SIZE.BOX
      SCROLL.UP/DOWN    +
      SCROLL.LEFT/RIGHT -
      CLOSE.BOX +
      ZOOM.BOX +  WORLD.OUTPUT  W.ATTRIBUTES
      THEN
    " Untitled "     WORLD.OUTPUT  W.TITLE
      WORLD.OUTPUT ON.UPDATE   REFRESH.VIEW
      WORLD.OUTPUT ON.ACTIVATE VIEWER
      WORLD.OUTPUT SCREEN.SIZE.WINDOW
```

```
    WORLD.OUTPUT ADD.WINDOW
    WORLD.OUTPUT WINDOW OUTFILE ON
    SET.WINDOW.LIMITS   ;

FIND INIT.NEW.WINDOW NEW.WINDOW.TOKEN !
```

```
( INIT.WORLD )                              ( 102586 YH )

\ WORLD MENU

cr ." Loading World Menu "

ANEW --WORLD.MENU--

HEX

hex#  A84F w>mt (SetItemCmd)  \ primitive for SET.ITEM.CMD
hex#  A84E mt   (GetItemCmd)  \ primitive for GET.ITEM.CMD


: GET.ITEM.CMD ( item#\menu ID# -- mark )
  \ get mark character of Item# of Menu ID  (= $1B if has a SubMenu attached)
  0 locals| TheChar |
  menu.handle  swap 0 wbury  addr.of TheChar 2- (GetItemCmd)
  TheChar   ;


: SET.ITEM.CMD ( item#\mark\menu ID# -- )
  \ set mark character of Item# of Menu ID  ( use $1B for Submenu)
  menu.handle  2 bury  swap 2 wbury (SetItemCmd)   ;


: INSTALL.HIER ( sub menu ID#\item#\menu ID# --   sub menu --> item# of Menu)
  \ appends appropriate stuff  to link menus and submenus.
  locals| MainMenu ITEM# SubMenu
  item# submenu mainmenu item.mark
  item# hex# 1B mainmenu set.item.cmd ;

DECIMAL


\ Anew World.Menu.File

: DO.WORLD.CURSOR.TWEEN
  0 LOCALS| THE.COUNT |
  CURRENT.OBJECT @ >R
  WORLD.OBJECT SET.CURRENT.OBJECT
     BEGIN
   THE.COUNT TWEEN.FACTOR !
   INSTANCE.TWEEN.OBJECT
   SET.ABSOLUTE
   DISPLAY.WORLD.CURSOR
   THE.COUNT 1+ TO THE.COUNT
  THE.COUNT TWEEN.COUNT @ > UNTIL
  R> SET.CURRENT.OBJECT ;


: SAVE.TWEEN.VARS
   OBJECT.ATTRIBUTES1 PLUCK
   TWEEN.COUNT @
   TWEEN.FACTOR @
   KEY.COUNT @
   CURRENT.KEY @
   LOOP.TWEEN? @ ;

: RESTORE.TWEEN.VARS
  LOOP.TWEEN? !
    CURRENT.KEY !
  KEY.COUNT !
  TWEEN.FACTOR !
```

-000799

```
TWEEN.COUNT !
  OBJECT.ATTRIBUTES1 PLACE ;

: SET.TWEEN.POSITION
  COSINES O.COSINES COS.LENGTH CMOVE
  OBJECT.ACOS COSINES SWAP MOVE.RECORD       \ fetch world's position
  OBJECT.A3POS PLUCK                 \ fetch world's position
  UN.SWIVEL                  \ swivel the vector
  O.COSINES COSINES COS.LENGTH CMOVE
  SWIVEL
  OBJECT.R3POS PLACE                 \ fetch world's position
  O.COSINES OBJECT.ACOS MOVE.RECORD
  O.COSINES OBJECT.RCOS MOVE.RECORD ;        \ place in the world's position

: PUT.TWEEN.WORLD
   WORLD.OUTPUT BRING.TO.FRONT
   CURRENT.OBJECT @  >R           \ save the current object
   WORLD.OBJECT  SET.CURRENT.OBJECT    \ set world as current
   "UNDO.WORLD.MOVE SET.UNDOS
   MARK.CHANGE
   SAVE.TWEEN.VARS              \ save world tween records on stack
   0 CURRENT.KEY !
   SET.KEY.OBJECT.FRAME
   SET.TWEEN.POSITION
   1 KEY.COUNT !
   1 CURRENT.KEY !
   LOOP.TWEEN? off
   SET.KEY.OBJECT.FRAME
   0 CURRENT.KEY !
   10 TWEEN.COUNT !             \ set number of frames to 30
   CLEAR.REDRAW
   RE.TOGGLE
   CLEAR.REDRAW               \ clear the line cursor
   DO.WORLD.CURSOR.TWEEN        \ do the tweening
    0 DRAW.CHECK !
   CLEAR.REDRAW
   RE.TOGGLE
   CLEAR.REDRAW               \ clear the line cursor
   OBJECT.CHANGED               \ mark as changed
   REDRAW.WORLD
   SHOW.CURSOR                \ redraw the world in it's new location
   RESTORE.TWEEN.VARS
   GET.WINDOW WORLD.OUTPUT = IF
   SET.SCROLL THEN
   R> SET.CURRENT.OBJECT   ;       \ restore current object

: NORMAL.SIZE
  CURRENT.OBJECT @ >R
  WORLD.OBJECT SET.CURRENT.OBJECT
  "UNDO.WORLD.MOVE SET.UNDOS
    MARK.CHANGE
  OBJECT.RSCALE PLUCK
  SCALE.RANGE = NOT IF
    SCALE.RANGE OBJECT.RSCALE PLACE
    REDRAW.WORLD SHOW.CURSOR
  THEN
  R> SET.CURRENT.OBJECT ;

: REDUCE
  CURRENT.OBJECT @ >R
```

-000800

```
  WORLD.OBJECT SET.CURRENT.OBJECT
  "UNDO.WORLD.MOVE SET.UNDOS
    MARK.CHANGE
  OBJECT.RSCALE PLUCK
    3 * 4/ OBJECT.RSCALE PLACE
    REDRAW.WORLD SHOW.CURSOR
  R> SET.CURRENT.OBJECT ;

: ENLARGE
  CURRENT.OBJECT @ >R
  WORLD.OBJECT SET.CURRENT.OBJECT
  "UNDO.WORLD.MOVE SET.UNDOS
    MARK.CHANGE
  OBJECT.RSCALE PLUCK
    4* 3 /  OBJECT.RSCALE PLACE
    REDRAW.WORLD SHOW.CURSOR
  R> SET.CURRENT.OBJECT ;

  VARIABLE WORLD.VIEW

  1 constant  WorldPos
  2 constant  WorldAtt
  4 constant  front
  5 constant  back
  6 constant  left
  7 constant  right
  8 constant  top
  9 constant  bottom


17 CONSTANT WORLD.VIEW.MENU
20 CONSTANT VIEW.ANGLE.MENU

   front WORLD.VIEW !

   : CHECK.WORLD.ITEM
     LOCALS| THE.BOOL |
     WORLD.VIEW @
     CASE
       WorldAtt OF
         2 THE.BOOL WORLD.MENU ITEM.CHECK
       ENDOF
       front OF
         1 THE.BOOL WORLD.VIEW.MENU ITEM.CHECK
       ENDOF
       back OF
         2 THE.BOOL WORLD.VIEW.MENU ITEM.CHECK
       ENDOF
       left OF
         3 THE.BOOL WORLD.VIEW.MENU ITEM.CHECK
       ENDOF
       right OF
         4 THE.BOOL WORLD.VIEW.MENU ITEM.CHECK
       ENDOF
       top OF
         5 THE.BOOL WORLD.VIEW.MENU ITEM.CHECK
       ENDOF
       bottom OF
         6 THE.BOOL WORLD.VIEW.MENU ITEM.CHECK
       ENDOF
     ENDCASE ;


   : SET.WORLD.VIEW
```

```
CURRENT.OBJECT @
LOCALS| C.OBJECT |
WORLD.OBJECT SET.CURRENT.OBJECT
FALSE CHECK.WORLD.ITEM
2 WORLD.VIEW !
FRONT.COS OBJECT.RCOS COMPARE.RECORD NOT IF
  FRONT WORLD.VIEW !
THEN
BACK.COS OBJECT.RCOS COMPARE.RECORD NOT IF
  BACK WORLD.VIEW !
THEN
VTOP.COS OBJECT.RCOS COMPARE.RECORD NOT IF
  TOP WORLD.VIEW !
THEN
VBOTTOM.COS OBJECT.RCOS COMPARE.RECORD NOT IF
  BOTTOM WORLD.VIEW !
THEN
LEFT.COS OBJECT.RCOS COMPARE.RECORD NOT IF
  LEFT WORLD.VIEW !
THEN
RIGHT.COS OBJECT.RCOS COMPARE.RECORD NOT IF
  RIGHT WORLD.VIEW !
THEN
C.OBJECT SET.CURRENT.OBJECT
TRUE CHECK.WORLD.ITEM   ;


: INIT.WORLD
  0
  12 204 ResString       \ " World "
 world.MENO NEW.MENU
 13 204 ResString       \ " World Position...;World Attitude...;-(;World View;View Angle"
  WORLD.MENO APPEND.ITEMS
 14 204 ResString       \ " -(;Normal Size;Reduce;Enlarge;Size to Fit"
  WORLD.MENO APPEND.ITEMS
 15 204 ResString       \ " -(;World Grid "
  WORLD.MENO APPEND.ITEMS
  WORLD.VIEW @
 -1 WORLD.MENO
 ITEM.CHECK   ;


: TOGGLE.3GRID
  USE.3GRID? @ IF
    0 USE.3GRID? !
    12 FALSE world.MENO ITEM.CHECK
  ELSE
    -1 USE.3GRID? !
    12 TRUE world.MENO ITEM.CHECK
  THEN ;


: WORLD.MENU.OFF
  0 FALSE WORLD.MENO ITEM.ENABLE ;


: WORLD.MENU.ON
  0 TRUE WORLD.MENO ITEM.ENABLE ;

\ world.menu.select


: WORLD.MENU.SELECT
  WORLD.MENO MENU.SELECTION:
```

-000802

```
    CASE
    1   OF
        WORLD.OBJECT SET.CURRENT.OBJECT
        OPEN.OBJECT.POS.WINDOW  ENDOF

    2 OF  WORLD.OBJECT SET.CURRENT.OBJECT
        OPEN.OBJECT.ATT.WINDOW  ENDOF

    7 OF NORMAL.SIZE ENDOF
    8 OF REDUCE      ENDOF
    9 OF ENLARGE     ENDOF
     10 OF SIZE.TO.FIT
       SET.SCROLL  ENDOF
     12 OF TOGGLE.3GRID   ENDOF

  ENDCASE
  0 HILITE.MENU  ;


: INIT.WORLD.VIEW
    -1
    12 204 ResString      \ " World "
    WORLD.VIEW.MENU NEW.MENU
    16 204 ResString      \ " Front;Back;Left;Right;Top;Bottom"
      WORLD.VIEW.MENU APPEND.ITEMS ;


  : WORLD.VIEW.MENU.SELECT
    WORLD.VIEW.MENU MENU.SELECTION:
  LOCALS| THE.HIT |
  THE.HIT WORLD.VIEW @ 3 - = NOT IF
        THE.HIT CASE
    1   OF
      FRONT.COS COSINES COS.LENGTH CMOVE
      PUT.TWEEN.WORLD ENDOF
        2   OF
      BACK.COS COSINES COS.LENGTH CMOVE
      PUT.TWEEN.WORLD ENDOF
        3   OF
      LEFT.COS COSINES COS.LENGTH CMOVE
      PUT.TWEEN.WORLD ENDOF
        4   OF
      RIGHT.COS COSINES COS.LENGTH CMOVE
      PUT.TWEEN.WORLD ENDOF
        5     OF
      VTOP.COS COSINES COS.LENGTH CMOVE
      PUT.TWEEN.WORLD ENDOF
        6   OF
      VBOTTOM.COS COSINES COS.LENGTH CMOVE
      PUT.TWEEN.WORLD ENDOF
    ENDCASE
  THEN
  0 HILITE.MENU  ;


 : INIT.VIEW.ANGLE
    -1
    17 204 ResString      \ " View Angle "
    VIEW.ANGLE.MENU NEW.MENU
    18 204 ResString      \ " Very Wide Angle;Wide Angle;Moderate Angle;Narrow Angle"
      VIEW.ANGLE.MENU APPEND.ITEMS ;


  : SET.CDIST
```

-000803

```
   DUP FIX.SCALE SCALE CDISTANCE !
   CDISTINT !
   SET.DEFAULT.CLIP.PLANE
   WORLD.OBJECT SET.CURRENT.OBJECT
   REDRAW.OBJECT
   DISPLAY.WORLD ;


 : VIEW.ANGLE.MENU.SELECT
   VIEW.ANGLE.MENU MENU.SELECTION:
 LOCALS| THE.HIT |
 THE.HIT CASE
   1   OF
     300 SET.CDIST  ENDOF
       2   OF
     500 SET.CDIST  ENDOF
       3   OF
     700 SET.CDIST  ENDOF
       4   OF
     1024 SET.CDIST  ENDOF
      ENDCASE
 0 HILITE.MENU  ;


: INSTALL.WORLD.MENU
  INIT.WORLD
  WORLD.MENU.SELECT
  INIT.WORLD.VIEW
  WORLD.VIEW.MENU.SELECT
  WORLD.VIEW.MENU 4
  WORLD.MENO
  INSTALL.HIER
  INIT.VIEW.ANGLE
  VIEW.ANGLE.MENU.SELECT
  VIEW.ANGLE.MENU 5
  WORLD.MENO
  INSTALL.HIER  ;

  : SET.VIEW.ANGLE.MENU
    1 FALSE VIEW.ANGLE.MENU ITEM.CHECK
    2 FALSE VIEW.ANGLE.MENU ITEM.CHECK
    3 FALSE VIEW.ANGLE.MENU ITEM.CHECK
    4 FALSE VIEW.ANGLE.MENU ITEM.CHECK
    CDISTINT @ case
      300 of 1 TRUE VIEW.ANGLE.MENU ITEM.CHECK ENDOF
      500 of 2 TRUE VIEW.ANGLE.MENU ITEM.CHECK ENDOF
      700 of 3 TRUE VIEW.ANGLE.MENU ITEM.CHECK ENDOF
       1024 of 4 TRUE VIEW.ANGLE.MENU ITEM.CHECK ENDOF
    ENDCASE ;
```

-000804

```
\ WORLD.PRINTING FOR THE SWIV

anew world.printing.1

CR ." Loading World Printing..."


\ Low level words to print the screen, a window, and a rectangle


: Print.world            \ draws a swivel world for printing
  CURRENT.OBJECT @
  LOCALS| C.OBJECT |
  0 to error.flag
  Procedural? @ If        \ using procedural graphics?
    DRAW.POSTSCRIPT.TREE
    error.flag if
      error.flag PrSetError
    then
  Else
    Draw.Postscript.Image \ draw a postscript picture
    error.flag if
      error.flag PrSetError
    then
  Then
  C.OBJECT SET.CURRENT.OBJECT ;


  Find Print.world constant ^Print.world


: Do.Print.Job                 \ print without dialog
  ^Print.world to Print.token
   Print.without.dialog ;


: Do.Print                     \ print with dialog
  ^Print.world to Print.token
   Print.with.dialog ;
```

```
ANEW --PICS2--

GLOBAL PICS.FRAME.POINTER
128 TO PICS.FRAME.POINTER

GLOBAL PICS.FILE.REF
GLOBAL PICS.FILE#

VARIABLE PICS.FILE.NAME  60 ALLOT
PICS.FILE.NAME 60 ERASE
0 PICS.FILE.NAME C!

ASCII PICS CONSTANT PICS.RES.FILE
CREATE LAST.RECT  0 , 0 ,

: RES.ERROR?
  RES.ERROR ?DUP IF
    TO ERROR.FLAG
  THEN ;

: MAKE.PICS.FRAME               \ write a pict from the current object
    0 LOCALS| C.PICT  |         \ define locals
     ENTER.CURRENT.BACKPORT       \ set backport as current
     PICS.FRAME.POINTER
     128 = IF
      SET.TREE.BOUNDS          \ set the tree bounds
      BOUNDS.RECT @RECT          \ fetch the bounds rectangle
      SWAP 2SWAP SWAP 2SWAP        \ convert to TBLR
      LAST.RECT !RECT          \ place in pict.rect
      0 0
      ZBUFFERY @
      ZBUFFERX  @
      PICT.RECT !RECT          \ place in pict.rect
     ELSE
      SET.TREE.BOUNDS          \ set the tree bounds
      BOUNDS.RECT @RECT          \ fetch the bounds rectangle
      SWAP 2SWAP SWAP 2SWAP        \ convert to TBLR
      PICT.RECT !RECT          \ place in pict.rect
      PICT.RECT @RECT
      TEMP.RECT !RECT
      LAST.RECT PICT.RECT
      DUP UNION.RECT
      TEMP.RECT @RECT
      LAST.RECT !RECT
    THEN
      SAVE.CLIP >R
      PICT.RECT CLIP.RECT
      PICT.RECT OPEN.PICTURE
      TO C.PICT              \ open the picture
        BACK.BITS            \ blit from itself to itself
        GET.WINDOW 2+
            PICT.RECT  DUP        \ use the calculated rect
          0 0 COPY.BITS          \ do the copy
          CLOSE.PICTURE          \ close the picture
      R> RESTORE.CLIP           \ close the picture
    EXIT.CURRENT.BACKPORT
    C.PICT  ;

: NEW.PICS.FILE
  0 LOCALS| N.FILE |
  PICS.RES.FILE DFLT.FILE.TYPE !              \ set the default type
  PICS.FILE.REF  VOLREF# !
    IODIR OFF RW
```

-000306

```
   0 PICS.FILE.NAME NEW.FILE TO N.FILE          \ open a new file
   POST.FILE.ERROR?                     \ post error if exists
   N.FILE 0 > IF
     N.FILE CLOSE
     POST.FILE.ERROR?                   \ post error if there is one
     PICS.FILE.REF  VOLREF# !               \ set io one shots
     IODIR OFF
     0 PICS.FILE.REF  SETVOL                \ set volume
     PICS.FILE.NAME  CREATE.RES.FILE           \ create a resource fork to the file
     RES.ERROR?
     ERROR.FLAG 0 < IF
       0 PICS.FILE.NAME !
       -1 TO EXIT.FLAG
     THEN
   THEN  ;


: (OPEN.PICS.FILE)
  0 LOCALS| N.FILE !
  PICS.RES.FILE                     \ set default type
  DFLT.FILE.TYPE !
  IODIR OFF
    PICS.FILE.REF  VOLREF# !                 \ set io one shots
  0 PICS.FILE.REF  SETVOL                \ set volume
  PICS.FILE.NAME
  OPEN.RES.FILE TO PICS.FILE#
  RES.ERROR?
  ERROR.FLAG PICS.FILE# 1 < OR IF
    0 TO PICS.FILE#
    -1 TO EXIT.FLAG
  THEN ;                          \ else post error and leave


: (CLOSE.PICS.FILE)
  UPDATE.RESOURCES                  \ update the resource file
  PICS.FILE# 0> IF
    UPDATE.RESOURCES
    RES.ERROR?
    ERROR.FLAG IF
     -1 TO EXIT.FLAG
   THEN
    PICS.FILE# CLOSE.RES.FILE
    0 TO PICS.FILE#
  THEN ;


: (PUT.PICS.FILE)                        \ --  file.id/true or false
  0 0 LOCALS| REF# FILE#
    REPLY 74 ERASE                     \ clear reply
  PICS.RES.FILE DFLT.FILE.TYPE !              \ set default file
  75 75 XY>POINT                     \ screen.position
  17 203 ResString       \ " PICS File "
  " .pics" APPEND.TITLE
  REPLY (PUT.FILE)                  \ buffer and call (put.file)
  DISCARD.ACTIVATES  FRONT.WINDOW (WINDOW)         \ put away nicely
  REPLY C@ BOOLEAN                          \ test for response
  IF                         \ if selected file
    REPLY 6+ <W@  TO REF#                 \ set local ref#
    REF# TO PICS.FILE.REF
    IODIR OFF
    REF# VOLREF# !                   \ set one shot
    REPLY 10+ DUP C@ 1-
    PICS.FILE.NAME SWAP CMOVE              \ save file name to global
      REPLY 10- DELETES              \ delete this file
```

-000307

I

```
    NEW.PICS.FILE
  ELSE
    -1 TO EXIT.FLAG
  THEN  ;                              \ 0 FOR CANCEL

: WRITE.PICS.FRAME
  CURRENT.OBJECT @
  0 LOCALS| C.PICT C.OBJECT |
  PICS.FILE.NAME C@ 0= IF
    (PUT.PICS.FILE)
  THEN
  PICS.FILE.NAME C@ 0= NOT IF
    WORLD.OBJECT SET.CURRENT.OBJECT
    MAKE.PICS.FRAME TO C.PICT
      C.PICT IF
      (OPEN.PICS.FILE)
      PICS.FILE# 0 > IF
        C.PICT
        "PICT
        PICS.FRAME.POINTER
        NIL.NAME ADD.RESOURCE
        RES.ERROR?
        ERROR.FLAG -1 > IF
          C.PICT WRITE.RESOURCE
          RES.ERROR?                  \ post error if there is one
          ERROR.FLAG 0 < IF
            -1 TO EXIT.FLAG
            C.PICT REMOVE.RESOURCE
          ELSE
            C.PICT DETACH.RESOURCE
          THEN
        ELSE
          -1 TO EXIT.FLAG
        THEN
        C.PICT DISPOSE.PICTURE
        (CLOSE.PICS.FILE)
      THEN
      PICS.FRAME.POINTER 1+
      TO PICS.FRAME.POINTER
      ELSE
      10 SYSBEEP
      -1 TO EXIT.FLAG
    THEN
    ELSE
      -108 TO ERROR.FLAG
      -1 TO EXIT.FLAG
    THEN
  C.OBJECT SET.CURRENT.OBJECT
  DO.ERROR.ALERT  ;

  : INIT.TWEEN.PICS
    TWEEN.FACTOR @ 0= IF
      0 PICS.FILE.NAME C!
      128 TO PICS.FRAME.POINTER
    THEN
    PICS.FILE.NAME C@ 0= IF
      (PUT.PICS.FILE)
    THEN
    DO.ERROR.ALERT ;

  : InitPics
```

-000308

```
    0 PICS.FILE.NAME C!
    128 TO PICS.FRAME.POINTER
    (PUT.PICS.FILE)
    DO.ERROR.ALERT  ;


  FIND WRITE.PICS.FRAME ' PICS.SAVE !
```

6/1/90 20:09 Write ZSYS Page 1

```
ANEW --ZSYS1--

GLOBAL CURRENT.SMAP.PICT
0 TO CURRENT.SMAP.PICT
HEX
FFFF8000 CONSTANT SMAP.PICT.MASK
DECIMAL
GLOBAL ZSYS.FILE.REF
GLOBAL ZSYS.FILE#
VARIABLE ZSYS.FILE.NAME  60 ALLOT
ZSYS.FILE.NAME 60 ERASE
0 ZSYS.FILE.NAME C!
ASCII ZSYS CONSTANT ZSYS.RES.FILE
CREATE LAST.RECT  0 , 0 ,


: MAKE.ZSYS.FRAME              \ write a pict from the current object
    ENCODE.SWIV? @ >R
    ENCODE.SWIV? OFF
    MAKE.OBJECT.PICT
    R> ENCODE.SWIV? ! ;


: NEW.ZSYS.FILE
  0 LOCALS| N.FILE |
  ZSYS.RES.FILE DFLT.FILE.TYPE !              \ set the default type
  ZSYS.FILE.REF  VOLREF# !
    IODIR OFF RW
    0 ZSYS.FILE.NAME NEW.FILE TO N.FILE         \ open a new file
    POST.FILE.ERROR?                  \ post error if exists
    N.FILE 0 > IF
      N.FILE CLOSE
      POST.FILE.ERROR?                \ post error if there is one
      ZSYS.FILE.REF  VOLREF# !            \ set io one shots
      IODIR OFF
      0 ZSYS.FILE.REF  SETVOL             \ set volume
      ZSYS.FILE.NAME  CREATE.RES.FILE         \ create a resource fork to the file
      RES.ERROR?
      ERROR.FLAG 0 < IF
        0 ZSYS.FILE.NAME !
        -1 TO EXIT.FLAG
      THEN
    THEN  ;


: (OPEN.ZSYS.FILE)
  0 LOCALS| N.FILE |
  ZSYS.RES.FILE                       \ set default type
  DFLT.FILE.TYPE !
  IODIR OFF
    ZSYS.FILE.REF  VOLREF# !              \ set io one shots
  0 ZSYS.FILE.REF  SETVOL               \ set volume
  ZSYS.FILE.NAME
  OPEN.RES.FILE TO ZSYS.FILE#
  RES.ERROR?
  ERROR.FLAG ZSYS.FILE# 1 < OR IF
    0 TO ZSYS.FILE#
    -1 TO EXIT.FLAG
  THEN ;                           \ else post error and leave


: (CLOSE.ZSYS.FILE)
  UPDATE.RESOURCES                    \ update the resource file
```

-000810

```
ZSYS.FILE# 0> IF
   UPDATE.RESOURCES
   RES.ERROR?
   ERROR.FLAG IF
    -1 TO EXIT.FLAG
    10 SYSBEEP
   THEN
   ZSYS.FILE# CLOSE.RES.FILE
   0 TO ZSYS.FILE#
THEN ;


: (PUT.ZSYS.FILE)                    \ --  file.id/true or false
 0 0 LOCALS| REF# FILE# |
   REPLY 74 ERASE
 ASCII "MACS CREATOR !               \ clear reply
 ZSYS.RES.FILE DFLT.FILE.TYPE !             \ set default file
 75 75 XY>POINT                      \ screen.position
 18 203 ResString       \ " Save as Scrapbook"           \ prompt
 " .Scrap" APPEND.TITLE
 REPLY (PUT.FILE)                    \ buffer and call (put.file)
 DISCARD.ACTIVATES  FRONT.WINDOW (WINDOW)         \ put away nicely
 REPLY C@ BOOLEAN                          \ test for response
 IF                          \ if selected file
   REPLY 6+ <W@  TO REF#                \ set local ref#
   REF# TO ZSYS.FILE.REF
   IODIR OFF
   REF# VOLREF# !                    \ set one shot
   REPLY 10+ DUP C@ 1-
   ZSYS.FILE.NAME SWAP CMOVE                \ save file name to global
     REPLY 10+ DELETES               \ delete this file
   NEW.ZSYS.FILE
 ELSE
   -1 TO EXIT.FLAG
 THEN
 ASCII "SWVL CREATOR !               \ clear reply
 ;                           \ 0 FOR CANCEL


: SMAP.MATCH?
 0 LOCALS| MATCH.FLAG SMAP.NUMBER SMAP.HANDLE
 256 0 DO
   SMAP.HANDLE @ I+ C@ SMAP.NUMBER = IF
     -1 TO MATCH.FLAG
   THEN
 LOOP
 MATCH.FLAG ;


: NEXT.SMAP.NUMBER                   \ smap.handle -- smap.number, zero if out of memory
 0 1  LOCALS| MATCH.FLAG SMAP.NUMBER SMAP.HANDLE |
 BEGIN
   SMAP.HANDLE SMAP.NUMBER SMAP.MATCH?
   TO MATCH.FLAG
   MATCH.FLAG IF
     SMAP.NUMBER 1+ TO SMAP.NUMBER
   THEN
   MATCH.FLAG 0=
   SMAP.NUMBER 256 = OR
 UNTIL
 SMAP.NUMBER 256 = MATCH.FLAG AND IF
   0 TO SMAP.NUMBER
 THEN
 SMAP.NUMBER ;
```

-000811

```
: SHIFT.SMAP
    LOCALS| LAST.NUM SMAP.HANDLE
  256 0 DO
    SMAP.HANDLE @ I+ C@
    LAST.NUM SMAP.HANDLE @ I+ C!
    TO LAST.NUM
  LOOP ;

: (WRITE.SMAP)
  0 LOCALS|  SMAP.NUMBER SMAP.HANDLE
  SMAP.HANDLE NEXT.SMAP.NUMBER TO SMAP.NUMBER
  SMAP.NUMBER 0> IF
    SMAP.HANDLE SMAP.NUMBER  SHIFT.SMAP
    SMAP.NUMBER 1- SMAP.PICT.MASK OR
    TO CURRENT.SMAP.PICT
  ELSE
    -108 TO ERROR.FLAG
    -1 TO EXIT.FLAG
    0 TO CURRENT.SMAP.PICT
  THEN ;


: WRITE.SMAP
  0 LOCALS| SMAP.HANDLE
  ASCII SMAP 0 GET1RESOURCE TO SMAP.HANDLE
  SMAP.HANDLE 0 = IF
    256 FROM.MIN.HEAP TO SMAP.HANDLE
    SMAP.HANDLE HANDLE.SIZE 256 = IF
      SMAP.HANDLE @ 256 ERASE
      SMAP.HANDLE (WRITE.SMAP)
      SMAP.HANDLE
      ASCII SMAP 0
      NIL.NAME ADD.RESOURCE
      SMAP.HANDLE WRITE.RESOURCE
      SMAP.HANDLE DETACH.RESOURCE
      SMAP.HANDLE TO.HEAP
    ELSE
      -1 TO EXIT.FLAG
      -108 TO ERROR.FLAG
      0 TO CURRENT.SMAP.PICT
    THEN
  ELSE
    SMAP.HANDLE HANDLE.SIZE 256 = IF
      SMAP.HANDLE (WRITE.SMAP)
      SMAP.HANDLE CHANGED.RESOURCE
      SMAP.HANDLE WRITE.RESOURCE
      SMAP.HANDLE DETACH.RESOURCE
      SMAP.HANDLE TO.HEAP
    ELSE
      -108 TO ERROR.FLAG
      0 TO CURRENT.SMAP.PICT
    THEN
  THEN  ;

: WRITE.ZSYS.FRAME
  CURRENT.OBJECT @
  0 LOCALS| C.PICT C.OBJECT
  ZSYS.FILE.NAME C@ 0= IF
    (PUT.ZSYS.FILE)
```

-000812

```
THEN
ZSYS.FILE.NAME C@ 0= NOT IF
  WORLD.OBJECT SET.CURRENT.OBJECT
  MAKE.ZSYS.FRAME TO C.PICT
    C.PICT IF
    (OPEN.ZSYS.FILE)
    ZSYS.FILE# 0 > IF
      WRITE.SMAP
      CURRENT.SMAP.PICT 0= NOT IF
        C.PICT
        "PICT
        CURRENT.SMAP.PICT
        NIL.NAME ADD.RESOURCE
        C.PICT WRITE.RESOURCE
        RES.ERROR?
        ERROR.FLAG -1 > IF
          C.PICT WRITE.RESOURCE
          RES.ERROR?                    \ post error if there is one
          ERROR.FLAG 0 < IF
            -1 TO EXIT.FLAG
            C.PICT REMOVE.RESOURCE
          ELSE
            C.PICT DETACH.RESOURCE
          THEN
        ELSE
          10 SYSBEEP
          -1 TO EXIT.FLAG
        THEN
        C.PICT DISPOSE.PICTURE
      THEN
      (CLOSE.ZSYS.FILE)
    THEN
  ELSE
    10 SYSBEEP
  THEN
THEN
C.OBJECT SET.CURRENT.OBJECT
DO.ERROR.ALERT ;


 : INIT.TWEEN.ZSYS
 TWEEN.FACTOR @ 0= IF
   0 ZSYS.FILE.NAME C!
 THEN
 ZSYS.FILE.NAME C@ 0= IF
   (PUT.ZSYS.FILE)
 THEN  ;


: InitZsys
  0 ZSYS.FILE.NAME C!
  (PUT.ZSYS.FILE)  ;


find WRITE.ZSYS.FRAME ' SCRAP.SAVE !
```

```
\ writes 32 bit color swivel file

anew 32.pict

decimal

.509 MakeSwapOver WRITE.32.PICT

StartSwapOver

create PICT.BUFF 64 allot
create PICT.FILE 0 ,


Create Red.RGB  color.scale w, 0 ,
Create Green.RGB  0 w, color.scale w, 0 w,
Create Blue.RGB  0 , color.scale w,
34 constant colormode

: SepColor>RGB
  LOCALS| The.RGB Sep.RGB THE.INDEX                    \ set locals
  256 the.index - to the.index
  Sep.RGB w@ the.index 256 */ The.RGB w!
  Sep.RGB 2+ w@ the.index 256 */ The.RGB 2+ w!
  Sep.RGB 4+ w@ the.index 256 */ The.RGB 4+ w! ;


: SepColor>CLUT                          \ sets the gdevice for one color key
  0 0 0 LOCALS| THE.MAP MAP.RGB THE.CLUT Sep.RGB THE.INDEX      \ set locals
  BACK.GDEVICE @ @ +GDPMAP @  TO THE.MAP             \ find the gdevice pixmap
  THE.MAP @ +PMTABLE @ TO THE.CLUT                 \ find the gdevice clut
  THE.CLUT LOCK.HANDLE                       \ lock the gdevice clut
  THE.CLUT @ +CTTABLE                        \ address of spec array
  THE.INDEX COLORSPEC * +                      \ address of index in array
  +CSRGBCOLOR TO MAP.RGB                       \ map.rgb is the destination
    THE.INDEX SEP.RGB MAP.RGB SepColor>RGB
  THE.CLUT UNLOCK.HANDLE  ;


  : SetSeparation                        \ sets all color keys into the gdevice clut
  0 0 LOCALS| THE.MAP THE.CLUT Sep.RGB                \ make space for locals
  SWIV.COLORS @ @ +CTSIZE W@ 1+ 0 DO                \ loop for the number of keys
    I Sep.RGB SepColor>CLUT                    \ set this one index into the gdevice clut
  LOOP
  BACK.GDEVICE @ @ +GDPMAP @  TO THE.MAP              \ find the gdevice pixmap
  THE.MAP @ +PMTABLE @ TO THE.CLUT
  THE.CLUT @ +CTSEED @ 8 -
  THE.CLUT @ +CTSEED !                       \ change the seed
  SET.SWIV.COLORS
  BUILD.KEY.SHADOW.TABLE
  BACKGDEVICE>PALETTE
  SET.WORLD.PALETTE.INDEX ;


  : MAKE.Sep.PICT                \ write a pict from the current object
    0 LOCALS| C.PICT |             \ define locals
     Error.flag 0=
     Exit.Flag 0= and if
      ENTER.CURRENT.BACKPORT
      BACK.BITS 6+ @RECT
        PICT.RECT !RECT            \ clip pict.rect to
      SAVE.CLIP >R
        PICT.RECT CLIP.RECT
        PICT.RECT OPEN.PICTURE
```

-000814

```
      TO C.PICT              \ open the picture
      BACK.BITS              \ blit from itself to itself
      GET.WINDOW 2-
          PICT.RECT  DUP          \ use the calculated rect
        colormode 0 COPY.BITS        \ do the copy
        CLOSE.PICTURE          \ close the picture
      QDError to Error.Flag
      R> RESTORE.CLIP        \ close the picture
    EXIT.CURRENT.BACKPORT
    C.PICT
  then ;


: SET.UP.PICT                \ set 512 byte header to nil
  PICT.BUFF 64 ERASE
  512 0 DO
     PICT.BUFF 64 I PICT.FILE @ WRITE.VIRTUAL
   IO-RESULT @ ?dup IF
    TO ERROR.FLAG
  THEN
  64 +LOOP  ;


: WRITE.PICT.FILE
  LOCALS| C.PICT |
  SET.UP.PICT
  C.PICT HANDLE.SIZE 0> IF
      C.PICT LOCK.HANDLE
        C.PICT @ C.PICT HANDLE.SIZE
          512 PICT.FILE @ WRITE.VIRTUAL
      IO-RESULT @ ?dup IF
        TO ERROR.FLAG
      THEN
      C.PICT UNLOCK.HANDLE
    THEN  ;


  : Do.32.render
    0 0 0 0 0 0 locals| the.mono HALF.COLOR RedPict GreenPict BluePict C.PICT
    Halftone.color @ to HALF.COLOR
    monochrome? to the.mono
    -1 to monochrome?
    0 to error.flag
    0 to exit.flag
    1 HALFTONE.COLOR !
    RED.RGB SetSeparation
    SetMaterialsChanged
    DO.EFFECTS.RENDER
    MAKE.Sep.PICT to RedPict
    Error.flag 0=
    Exit.Flag 0= and
    RedPict 0> and if
      2 HALFTONE.COLOR !
      GREEN.RGB SetSeparation
      SetMaterialsChanged
      DO.EFFECTS.RENDER
      MAKE.Sep.PICT to GreenPict
      Error.flag 0=
      Exit.Flag 0= and
      GreenPict 0> and if
        3 HALFTONE.COLOR !
        BLUE.RGB SetSeparation
        SetMaterialsChanged
```

-000815

6/1/90 20:09 Write.32.Pict Page 3

```
        DO.EFFECTS.RENDER
        MAKE.Sep.PICT to BluePict
        Error.flag 0=
        Exit.Flag 0= and
        BluePict 0> and if
          ENTER.CURRENT.BACKPORT
          BACK.BITS 6+ @RECT
            PICT.RECT !RECT            \ clip pict.rect to
          SAVE.CLIP >R
          PICT.RECT CLIP.RECT
          PICT.RECT OPEN.PICTURE
          TO C.PICT                  \ open the picture
          PICT.RECT @rect
          SWAP 2SWAP SWAP 2SWAP
          BLACK PATTERN RECTANGLE
          redpict PICT.RECT DRAW.PICTURE
          redpict dispose.picture
          0 to redpict
          greenpict PICT.RECT DRAW.PICTURE
          greenpict dispose.picture
          0 to greenpict
          bluepict PICT.RECT DRAW.PICTURE
          bluepict dispose.picture
          0 to bluepict
          CLOSE.PICTURE
          QDError to Error.Flag
          R> RESTORE.CLIP
          C.PICT 0 >
          EXIT.CURRENT.BACKPORT
          error.flag 0= and if
            get.window >R
            world.output window
            C.PICT write.pict.file
            C.PICT dispose.picture
            R> window
          then

        then
      then
    then
    redpict if
      redpict dispose.picture
    then
    greenpict if
      greenpict dispose.picture
    then
    bluepict if
      bluepict dispose.picture
    then
    do.error.alert
    0 to error.flag
    the.mono to monochrome?
    half.color HALFTONE.COLOR !
    INIT.WINDOW.PALETTE
    SET.WORLD.PALETTE.INDEX
    SetMaterialsChanged
    WORLD.OBJECT set.current.object
    redraw.object
    display.world ;

  : (WRITE.32.PICT)
    " .PICT" APPEND.TITLE
      15 203 ResString              \ " PICT file"
```

-000816

```
    ASCII PICT                    Set default file
  NEW.TEMP.FILE Pict.file !
  Pict.FILE @ if
    Do.32.render
    Pict.file @ CLOSE
 THEN   ;

SetSwapOverToken
EndSwapOver
```

```
\ writes a DXF File for AutoCad

." Loading DXF file output "
cr

decimal

506 MakeSwapOver WRITE.DXF.FILE

StartSwapOver


GLOBAL    C.DXF.FILE
GLOBAL    C.REF#
GLOBAL    DXF.POINTER


VARIABLE  DXF.STRING  256 ALLOT
VARIABLE  C.NAME    256 ALLOT

CREATE "CR    1 C, 13 C,


: ADD.FILE.STRING
    LOCALS| THE.STRING
    ERROR.FLAG 0= IF
    THE.STRING 1+ THE.STRING C@ DXF.POINTER C.DXF.FILE WRITE.VIRTUAL
    THE.STRING C@ DXF.POINTER + TO DXF.POINTER
    IO-RESULT @ TO ERROR.FLAG
    THEN ;


 : ADD.FILE.INTEGER
  LOCALS| THE.NUM |
  DXF.STRING 255 BLANKS
  THE.NUM DXF.STRING #>S!
  DXF.STRING ADD.FILE.STRING
  "CR ADD.FILE.STRING ;


 : ADD.FILE.FIXED
  LOCALS| THE.NUM |
  DXF.STRING 255 BLANKS
  THE.NUM DXF.STRING FIXED>MEASURES!
  DXF.STRING ADD.FILE.STRING
  "CR ADD.FILE.STRING ;

: CRReplace
  LOCALS| THE.STRING |
  THE.STRING C@ 0 DO
     THE.STRING 1+ I+ C@
     ASCII ^ = IF
      13 THE.STRING 1+ I+ C!
     THEN
     THE.STRING 1+ I+ C@
     ASCII - = IF
      32 THE.STRING 1+ I+ C!
     THEN
   LOOP ;

 CREATE "ENTITIES ,"    0^SECTION^  2^ENTITIES^"
 "ENTITIES CRReplace

 CREATE "POLYLINE ,"    0^POLYLINE^--8^0^-66^-----1^-10^0.0^-20^0.0^-30^0.0^"
```

-000818

T

```
"POLYLINE CRReplace

CREATE "3DMESHFLAG ," -70^----16^"
"3DMESHFLAG CRReplace

CREATE "3DPLINEFLAG ," -70^----8^"
"3DPLINEFLAG CRReplace

CREATE "VERTEX ," --0^VERTEX^--8^0^"
"VERTEX CRReplace

CREATE "3DMESHVFLAG ," -70^----64^"
"3DMESHVFLAG CRReplace

CREATE "3DPLINEVFLAG ," -70^----32^"
"3DPLINEVFLAG CRReplace

CREATE "MFLAG ," -71^----"
"MFLAG CRReplace

CREATE "NFLAG ," -72^----"
"NFLAG CRReplace

CREATE "SEQEND ," --0^SEQEND^--8^0^"
"SEQEND CRReplace

CREATE "EOF ," --0^ENDSEC^--0^EOF^"
"EOF CRReplace

CREATE "XFLAG 4 C, 32 C, ASCII 10 W, 13 C,
CREATE "YFLAG 4 C, 32 C, ASCII 20 W, 13 C,
CREATE "ZFLAG 4 C, 32 C, ASCII 30 W, 13 C,

 : WRITE.DXF.HEADER
  "ENTITIES ADD.FILE.STRING ;

 : WRITE.DXF.END
  "EOF ADD.FILE.STRING ;

 : START.DXF.POLY
  "POLYLINE    ADD.FILE.STRING
  "3DPLINEFLAG ADD.FILE.STRING  ;


 : START.DXF.MESH
  LOCALS| M N |
  "POLYLINE    ADD.FILE.STRING
  "3DMESHFLAG  ADD.FILE.STRING
  "MFLAG       ADD.FILE.STRING
  M         ADD.FILE.INTEGER
  "NFLAG       ADD.FILE.STRING
  N         ADD.FILE.INTEGER
  ;


 : ADD.DXF.MESH.VERT
  LOCALS| THE.POINT |
  "VERTEX      ADD.FILE.STRING
  "XFLAG       ADD.FILE.STRING
  THE.POINT 8+ @  ADD.FILE.FIXED
  "YFLAG       ADD.FILE.STRING
  THE.POINT 4+ @ NEG  ADD.FILE.FIXED
  "ZFLAG         ADD.FILE.STRING
  THE.POINT @     NEG ADD.FILE.FIXED
```

-000819

```
  "3DMESHVFLAG  ADD.FILE.STRING ;


 : ADD.DXF.POLY.VERT
  LOCALS| THE.POINT |
  "VERTEX      ADD.FILE.STRING
  "XFLAG       ADD.FILE.STRING
  THE.POINT 8+ @  ADD.FILE.FIXED
  "YFLAG       ADD.FILE.STRING
  THE.POINT 4+ @ NEG ADD.FILE.FIXED
  "ZFLAG       ADD.FILE.STRING
  THE.POINT @     NEG ADD.FILE.FIXED
  "3DPLINEVFLAG   ADD.FILE.STRING ;


 : DXF.MESH
  LOCALS| START.MESH NMESH MMESH |
  NMESH MMESH
  START.DXF.MESH
  NMESH MMESH * 0 DO
    START.MESH ADD.DXF.MESH.VERT
    START.MESH 3POINT.LENGTH + TO START.MESH
  LOOP
  "SEQEND ADD.FILE.STRING ;


 : DXF.FRONT.CAP              \ writes complex poly front cap
   3POINT.LENGTH              \ length of point record
   AllPoints 8+
   AllPoints 4+ @ 3POINT.LENGTH * 2* -   \ start of array
   LOCALS| THE.ALL OFF.POINT
   START.DXF.POLY              \ set the start edge count to zero
   AllPoints 4+ @   0 DO        \ loop through the cross section
      THE.ALL
    OFF.POINT -            \ we are counting backward...
      ADD.DXF.POLY.VERT
        OFF.POINT 3POINT.LENGTH -      \ increment the offset
    TO OFF.POINT
    LOOP
  "SEQEND ADD.FILE.STRING ;


\ end cap

 : DXF.END.CAP                 \ writes complex poly end cap
   0                  \ start offset at zero
   AllPoints 8+
   AllPoints 4+ @ 3POINT.LENGTH *
   AllPoints @ 2- * -          \ the start address of the cross section for the cap
   LOCALS| THE.ALL OFF.POINT
   START.DXF.POLY
   AllPoints 4+ @  0 DO          \ loop through the cross.section points
        THE.ALL
      OFF.POINT +           \ add start of the array to the offset
        ADD.DXF.POLY.VERT
          OFF.POINT 3POINT.LENGTH +    \ increment the offset
      TO OFF.POINT
   LOOP
   "SEQEND ADD.FILE.STRING ;


 : DRAW.DXF.MESH
  AllPoints 8+ AllPoints @ LOCALS| ROW.COUNT THE.MESH
  ROW.COUNT 2 > IF
```

-000820

```
    FRONT.CAP? @ IF
      DXF.FRONT.CAP
      THE.MESH
      AllPoints 4+ @
      3POINT.LENGTH * +
      TO THE.MESH
      ROW.COUNT 1- TO ROW.COUNT
    THEN
    ROW.COUNT 2 > IF
      BACK.CAP? @ IF
        DXF.END.CAP
        ROW.COUNT 1- TO ROW.COUNT
      THEN
      ROW.COUNT 1 > IF
        ROW.COUNT
        AllPoints 4+ @
        THE.MESH
        DXF.MESH
      THEN
    THEN
  THEN ;


 : DRAW.DXF.POLY
    LOCALS| THE.LIST |
    THE.LIST W@ MAX.TYPE.POINTS MIN #POLY.POINTS !
    THE.LIST 2+ SHADE.POINTS #POLY.POINTS @ 12 * CMOVE
    TRANS.SHADE.POINTS
    START.DXF.POLY
    #POLY.POINTS @ 0 DO
      SHADE.POINTS I 12 * -
      ADD.DXF.POLY.VERT
    LOOP
    "SEQEND ADD.FILE.STRING ;


 : DRAW.DXF.POLY.FORM
  OBJECT.TYPE DROP
    LOCALS| THE.LIST |
    BEGIN THE.LIST W@ WHILE
      THE.LIST DRAW.DXF.POLY
      THE.LIST W@ 12 * 2 +
      THE.LIST + TO THE.LIST
    REPEAT ;


 : DRAW.DXF.POLYNORMAL.FORM
  OBJECT.TYPE DROP
    LOCALS| THE.LIST |
    BEGIN THE.LIST W@ WHILE
      THE.LIST DRAW.DXF.POLY
      THE.LIST W@ 24 * 2 +
      THE.LIST + TO THE.LIST
    REPEAT ;


: WRITE.OBJECT.DXF
  CURRENT.OBJECT @
  WORLD.OBJECT = NOT IF
    SET.WATCH.CURSOR
```

-000821

```
    SET.ABSOLUTE                 \ set absolute values
    GET.OBJECT                  \ get the object
    OBJECT.FORM PLUCK CASE
      PATH.FORM OF
        THREE.LIST
        TRANS.ALL.POINTS 2DROP       \ translate the points
        DRAW.DXF.MESH
      ENDOF
      MESH.FORM OF
        TRANS.ALL.POINTS 2DROP       \ translate the points
        DRAW.DXF.MESH
      ENDOF
      POLY.FORM OF
        DRAW.DXF.POLY.FORM
      ENDOF
      POLYNORMAL.FORM OF
        DRAW.DXF.POLYNORMAL.FORM
      ENDOF
    ENDCASE
  THEN ;

: WRITE.TREE.DXF
    OPERATION @
    CURRENT.OBJECT @
    LOCALS| C.OBJECT C.OPERATION
      WRITE.DXF.HEADER
      TOKEN.FOR WRITE.OBJECT.DXF OPERATION !
      TRAVERSE.DOWN.TREE
      C.OBJECT SET.CURRENT.OBJECT
      C.OPERATION OPERATION !
      WRITE.DXF.END
    ;

: (WRITE.DXF.FILE)
    CURRENT.OBJECT @
    0 LOCALS| C.FILE C.OBJECT
    0 to DXF.POINTER
    0 to error.flag
    WORLD.OBJECT SET.CURRENT.OBJECT
    " .dxf" APPEND.TITLE
    19 203 ResString            \ " dxf for AutoCad"
    ASCII TEXT                 \ set default file
    NEW.TEMP.FILE TO C.DXF.FILE
    C.DXF.FILE IF
        SET.WATCH.CURSOR
        WRITE.TREE.DXF
        ERROR.FLAG IF
          10 sysbeep
          0 TO ERROR.FLAG
        THEN
        C.DXF.FILE CLOSE
    THEN
    C.OBJECT SET.CURRENT.OBJECT ;

SetSwapOverToken
EndSwapOver
```

-000822

```
\ writes object position, attitude, and scale
\ into a handle for the scrap or a text file

DECIMAL

502 MakeSwapOver WRITE.INFO.FILE

StartSwapOver


global c.text.handle
GLOBAL C.COMMAND.FILE
GLOBAL C.REF#
VARIABLE C.NAME 255 ALLOT
0 C.NAME !
GLOBAL COMMAND.POINTER


CREATE "SPCR  2 C, 32 C, 13 C,
CREATE "SPTAB  2 C, 32 C, 9 C,
CREATE "SP    2 C, 32 C, 32 C,
CREATE ",CR  2 C, 44 C, 13 C,


: +STRING.HANDLE  \ HANDLE, STRING -- DOES IT
  0 LOCALS| OLD.SIZE THE.STRING THE.HANDLE |
  THE.HANDLE HANDLE.SIZE DUP TO OLD.SIZE
  THE.STRING C@ +
  THE.HANDLE SWAP
    RESIZE.HANDLE TO ERROR.FLAG
  ERROR.FLAG 0= IF
    THE.STRING 1+
    C.TEXT.HANDLE @ OLD.SIZE +
    THE.STRING C@ CMOVE
  THEN ;


: Write.Name
  c.text.handle " FindObject " +STRING.HANDLE
  OBJECT.STRING PAD 1+ SWAP MOVE.RECORD
  OBJECT.STRING SWAP DROP EXT PAD C!
  c.text.handle PAD +STRING.HANDLE
  c.text.handle "SPCR +STRING.HANDLE ;

: ADD.SPACE
  c.text.handle "SP +STRING.HANDLE ;

: Write.Rel.Position
  c.text.handle " RelPos: " +STRING.HANDLE
  OBJECT.R3POS PLUCK neg >R >R
  PAD FIXED>MEASURES!
    c.text.handle PAD +STRING.HANDLE
  ADD.SPACE
  R> PAD FIXED>MEASURES!
    c.text.handle PAD +STRING.HANDLE
  ADD.SPACE
  R> PAD FIXED>MEASURES!
    c.text.handle PAD +STRING.HANDLE
  ADD.SPACE
  c.text.handle ",CR +STRING.HANDLE  ;

: Write.Rel.Attitude
  c.text.handle " RelAtt: " +STRING.HANDLE
```

-000823

```
OBJECT.RCOS PLUCK angle >R angle >R
ANGLE PAD #>$!
  c.text.handle PAD +STRING.HANDLE
ADD.SPACE
R>  PAD #>$!
  c.text.handle PAD +STRING.HANDLE
ADD.SPACE
R>  PAD #>$!
  c.text.handle PAD +STRING.HANDLE
ADD.SPACE
c.text.handle ",CR +STRING.HANDLE  ;


: Write.Rel.Scale
c.text.handle " RelScale: " +STRING.HANDLE
OBJECT.RSCALE PLUCK
>PERCENTAGE PAD  MEASURE>MEASURES!
  c.text.handle PAD +STRING.HANDLE
ADD.SPACE
c.text.handle ",CR +STRING.HANDLE  ;


: WRITE.OBJECT.ORIENT
  C.TEXT.HANDLE IF
  ERROR.FLAG 0= IF
    WRITE.NAME
    WRITE.REL.POSITION
    WRITE.REL.ATTITUDE
    WRITE.REL.SCALE
    c.text.handle "SPCR +STRING.HANDLE
  THEN
  THEN ;

: ADD.FIELD
  DROP
  LOCALS| THE.FIELD |
  c.text.handle THE.FIELD +STRING.HANDLE
  c.text.handle "SPTAB +STRING.HANDLE ;

: WRITE.OBJECT.INFO
  C.TEXT.HANDLE IF
  ERROR.FLAG 0= IF
    c.text.handle "SPCR +STRING.HANDLE
    OBJECT.STRING PAD 1- SWAP MOVE.RECORD
    OBJECT.STRING SWAP DROP EXT PAD C!
    c.text.handle PAD +STRING.HANDLE
    c.text.handle "SPTAB +STRING.HANDLE
    OBJECT.TEXT.FIELD0 ADD.FIELD
    OBJECT.TEXT.FIELD1 ADD.FIELD
    OBJECT.TEXT.FIELD2 ADD.FIELD
    OBJECT.TEXT.FIELD3 ADD.FIELD
    OBJECT.TEXT.FIELD4 ADD.FIELD
    OBJECT.TEXT.FIELD5 ADD.FIELD
    OBJECT.TEXT.FIELD6 ADD.FIELD
    OBJECT.TEXT.FIELD7 ADD.FIELD
  THEN
  THEN ;

: WRITE.TREE.ORIENT
  OPERATION @
  CURRENT.OBJECT @
  LOCALS| C.OBJECT C.OPERATION
```

-000824

```
   C.TEXT.HANDLE IF
     c.text.handle
     " ( Start of World Position ) " +STRING.HANDLE
     c.text.handle "SPCR +STRING.HANDLE
     TOKEN.FOR WRITE.OBJECT.ORIENT OPERATION !
     TRAVERSE.DOWN.TREE
     C.OBJECT SET.CURRENT.OBJECT
     C.OPERATION OPERATION !
   THEN ;

 : WRITE.TREE.INFO
   OPERATION @
   CURRENT.OBJECT @
   LOCALS| C.OBJECT C.OPERATION
   C.TEXT.HANDLE IF
     TOKEN.FOR WRITE.OBJECT.INFO OPERATION !
     TRAVERSE.DOWN.TREE
     C.OBJECT SET.CURRENT.OBJECT
     C.OPERATION OPERATION !
   THEN ;


 : NEW.HAND
   0 FROM.MIN.HEAP TO C.TEXT.HANDLE ;

 : DEL.HAND
   C.TEXT.HANDLE IF
     C.TEXT.HANDLE TO.HEAP
     0 TO C.TEXT.HANDLE
   THEN ;

 : TYPE.HAND
   c.text.handle @
   c.text.handle HANDLE.SIZE TYPE ;



: (WRITE.INFO.FILE)
    CURRENT.OBJECT @
    0 LOCALS| C.FILE C.OBJECT
    WORLD.OBJECT SET.CURRENT.OBJECT
    " .Info" APPEND.TITLE
    20 203 ResString        \ " TEXT for Excel "
    ASCII TEXT          \ set default file
    NEW.TEMP.FILE TO C.COMMAND.FILE
    C.COMMAND.FILE IF
      0 FROM.MIN.HEAP TO C.TEXT.HANDLE
      C.TEXT.HANDLE IF
        WRITE.TREE.INFO
        C.TEXT.HANDLE HANDLE.SIZE 0> IF
          C.TEXT.HANDLE LOCK.HANDLE
          C.TEXT.HANDLE @
          C.TEXT.HANDLE HANDLE.SIZE
          COMMAND.POINTER C.COMMAND.FILE WRITE.VIRTUAL
          COMMAND.POINTER C.TEXT.HANDLE HANDLE.SIZE +
          TO COMMAND.POINTER
          C.TEXT.HANDLE UNLOCK.HANDLE
          C.TEXT.HANDLE TO.HEAP
          0 C.NAME !
        ELSE
          -108 TO ERROR.FLAG
          DO.ERROR.ALERT
          0 TO ERROR.FLAG
        THEN
```

-000825

6/1/90 20:09 WRITE.INFO.FILE Page 4

```
      ELSE
        -108 TO ERROR.FLAG
        DO.ERROR.ALERT
        0 TO ERROR.FLAG
      THEN
      C.COMMAND.FILE CLOSE
    THEN
    C.OBJECT SET.CURRENT.OBJECT  ;

  SetSwapOverToken
  EndSwapOver
```

```
\ loads and compiles isaac files into an overlay

." Loading isaac file output "
cr

decimal

507 MakeSwapOver WRITE.ISAAC.FILE

StartSwapOver

global IS.POINTER
GLOBAL IS.FILE

0 TO IS.FILE
0 to IS.POINTER


include" little floating point"
include" isaac files.5"


: NEW.IS.FILE                    \ -- SETS EPS.FILE GLOBAL
    " .isaac" APPEND.TITLE
    21 203 ResString       \ " Isaac File "
    ASCII TEXT                    \ set default file
    NEW.TEMP.FILE TO IS.FILE
    0 TO IS.POINTER  ;

: (Write.Isaac.world)
    Operation @
    Current.Object @
    locals| the.ob the.op
    0 TO ERROR.FLAG
    NEW.IS.FILE
    IS.FILE if
      SET.WATCH.CURSOR
      MakeISHeader
      World.Object Set.Current.Object
      OBJECT.ACOS PLUCK
        OBJECT.A3POS PLUCK           \ save the orientation
      OBJECT.SCALE PLUCK
      0 yaw 0 pitch 0 roll           \ zero out the world for chuck
      cosines OBJECT.RCOS move.record
      0 0 0 OBJECT.R3POS PLACE
      scale.range OBJECT.RSCALE PLACE
      scale.range Object.scale PLACE
      Token.for write.Isaac.object operation !
      Traverse.Down.Tree
      the.op operation !
      OBJECT.RSCALE PLACE
      OBJECT.A3POS PLACE             \ restore the saved orientation
      OBJECT.ACOS PLACE
      OBJECT.A3POS PLUCK             \ set relatives from absolutes
      OBJECT.R3POS PLACE
      OBJECT.ACOS PLUCK
       OBJECT.RCOS PLACE
      the.ob set.current.object
      IS.FILE CLOSE
      INIT.CURSOR
    else
      error.flag if
        10 sysbeep
```

-000827

I

```
      then
    then ;

SetSwapOverToken
EndSwapOver
```

```
\ WRITE NEW PAINT FILE


cr ." Loading Write Paint..."

504 MakeSwapOver (WRITE.PAINT)

StartSwapOver


HEX

A8CF W>MT PACK.BITS   ( src ptr\dest ptr\src bytes  -- )
A8D0 W>MT UNPACK.BITS ( scr ptr\dest ptr\dest bytes -- )

DECIMAL

VARIABLE PAINT.BUFF 80 ALLOT
VARIABLE PAINT.FUFF 100 ALLOT


VARIABLE DEST.PTR
VARIABLE SRC.PTR
VARIABLE FILE.PTR
VARIABLE PAINT.FILE
VARIABLE #FUFF.BYTES
CREATE   PAINT#  0 ,



CREATE PAINT.MAP
    0 , 72 W, 0 W, 0 W, 1 W, 512 W,  0 W, 0 W, 1 W, 512 W,

CREATE WRITE.RECT  0 W, 0 W, 1 W, 512 W,

: SET.UP.WRITE           \ set 512 byte header to nil
  PAINT.BUFF PAINT.MAP !
  PAINT.BUFF 80 ERASE
  512 0 DO
     PAINT.BUFF 8 I PAINT.FILE @ WRITE.VIRTUAL
   IO-RESULT @ ?dup IF
    TO ERROR.FLAG
  THEN
  8 +LOOP
  512 FILE.PTR !
  0 0 1 ZBUFFERX @ WRITE.RECT !RECT
  0 0 1 zbufferx @ paint.map 6 - !rect
  0 0 1 zbufferx @ paint.map 14 - !rect  ;



: INC.WRITE.RECT
  WRITE.RECT W@ ZBUFFERY @ 1- < IF
  WRITE.RECT DUP W@ 1+ SWAP W!
  WRITE.RECT 4+ DUP W@ 1+ SWAP W!
  ELSE
  PAINT.BUFF 80 ERASE
  ZBUFFERY @ 1- WRITE.RECT  W!
  ZBUFFERY @ 1- WRITE.RECT 4+ W! THEN ;


: COPY.LINE
  BACK.BITS   PAINT.MAP
  WRITE.RECT  PAINT.MAP 6-
```

-000829

T

```
  0 0 COPY.BITS ;


: PACK.LINE
  PAINT.BUFF SRC.PTR !
  PAINT.FUFF DEST.PTR !
  SRC.PTR DEST.PTR  72 PACK.BITS
  DEST.PTR @ PAINT.FUFF - #FUFF.BYTES ! ;

: WRITE.LINE
  PAINT.FUFF #FUFF.BYTES @ FILE.PTR @ PAINT.FILE @ WRITE.VIRTUAL
    IO-RESULT @ ?dup IF
    TO ERROR.FLAG
  THEN
  FILE.PTR @ #FUFF.BYTES @ + FILE.PTR ! ;


: WRITE.PAINT
   " .PNTG" APPEND.TITLE
  22 203 ResString       \ " PNTG File "
  ASCII PNTG             \ set default file
  NEW.TEMP.FILE PAINT.FILE !
  PAINT.FILE @ if
      SET.UP.WRITE
      720 0 DO
        COPY.LINE
        PACK.LINE
        WRITE.LINE
        INC.WRITE.RECT
      LOOP
      PAINT.FILE @ CLOSE
    IO-RESULT @ ?dup IF
      TO ERROR.FLAG
    THEN
  THEN
  DO.ERROR.ALERT ;


  SetSwapOverToken
  EndSwapOver
```

-000830

I

```
\ WRITE NEW PICT FILE

cr ." Loading Write PICT..."

503 MakeSwapOver (WRITE.PICT)

StartSwapOver

VARIABLE PAINT.BUFF 80 ALLOT

VARIABLE FILE.PTR
VARIABLE PAINT.FILE
CREATE   PAINT#  0 ,

: SET.UP.PICT           \ set 512 byte header to nil
  PAINT.BUFF 80 ERASE
  512 0 DO
     PAINT.BUFF 8 I PAINT.FILE @ WRITE.VIRTUAL
   IO-RESULT @ ?dup IF
    TO ERROR.FLAG
  THEN
  8 +LOOP
  512 FILE.PTR ! ;

  : MAKE.FULL.PICT            \ write a pict from the current object
    0 LOCALS| C.PICT  |         \ define locals
     ENTER.CURRENT.BACKPORT
     0 0
     ZBUFFERY @
     ZBUFFERX  @
       PICT.RECT !RECT              \ clip pict.rect to
     SAVE.CLIP >R
      PICT.RECT CLIP.RECT
      PICT.RECT OPEN.PICTURE
      TO C.PICT              \ open the picture
      PROCEDURAL? @ IF
        DRAW.TOOLBOX.TREE
      ELSE
        BACK.BITS              \ blit from itself to itself
        GET.WINDOW 2+
            PICT.RECT  DUP        \ use the calculated rect
          0 0 COPY.BITS          \ do the copy
      THEN
        CLOSE.PICTURE            \ close the picture
      R> RESTORE.CLIP          \ close the picture
    EXIT.CURRENT.BACKPORT
    C.PICT ;

 : WRITE.PICT.FILE
   CURRENT.OBJECT @
   0 LOCALS| C.PICT C.OBJECT
   WORLD.OBJECT SET.CURRENT.OBJECT
   0 TO ERROR.FLAG
   MAKE.FULL.PICT TO C.PICT
   SCRAP.FLAG @ NOT IF
       C.PICT HANDLE.SIZE 0> IF
       C.PICT LOCK.HANDLE
```

-000831

```
      C.PICT @ C.PICT HANDLE.SIZE
        512 PAINT.FILE @ WRITE.VIRTUAL
    IO-RESULT @ ?dup IF
      TO ERROR.FLAG
    THEN
    C.PICT UNLOCK.HANDLE
    C.PICT DISPOSE.PICTURE
    ELSE  THEN
  ELSE
    C.PICT HANDLE.SIZE 0 > IF
      C.PICT DISPOSE.PICTURE
    THEN
    -108 TO ERROR.FLAG
  THEN
C.OBJECT SET.CURRENT.OBJECT
DO.ERROR.ALERT ;


: WRITE.PICT
  " .PICT" APPEND.TITLE
  15 203 ResString            \ " PICT File"
  ASCII PICT                 \ set default file
NEW.TEMP.FILE PAINT.FILE !
PAINT.FILE @ if
  SET.UP.PICT
    WRITE.PICT.FILE
    PAINT.FILE @ CLOSE
THEN  ;


SetSwapOverToken
EndSwapOver
```

```
\ writes output file

3 TO FILE.STYLE

: WriteOutput
  PROCEDURAL? @
  LOCALS| THIS.PRO |
  watch set.cursor
  set.all.material.fields
  FILE.STYLE CASE
  1 OF
     WRITE.32.PICT
  ENDOF
  2 OF PROCEDURAL? ON
     ASCII MDPL CREATOR !
     (WRITE.PICT) ENDOF
  3 OF PROCEDURAL? OFF
      ASCII ST/8 CREATOR !
     (WRITE.PICT) ENDOF
  4 OF
    ASCII ARTZ CREATOR !
    CREATE.EPS.FILE ENDOF
  5 OF
    ASCII XCEL CREATOR !
    WRITE.INFO.FILE ENDOF
  6 OF
    WRITE.RENDERMAN
    ENDOF
  7 OF
    WRITE.DXF.FILE
    ENDOF
  8 OF
    WRITE.SCREEN.DISPLAY
    ENDOF
  9 OF
    WRITE.24.SCREEN.DISPLAY
    ENDOF
  endcase
  THIS.PRO PROCEDURAL? !
  ASCII SWVL CREATOR !
  init.cursor ;


NULL.TOKEN CONSTANT PICS.SAVE
NULL.TOKEN CONSTANT SCRAP.SAVE
```

```
\ writes output file

8 TO FILE.STYLE

: WriteOutput
  PROCEDURAL? @
  LOCALS| THIS.PRO |
  watch set.cursor
  set.all.material.fields
  FILE.STYLE CASE
  1 OF
     WRITE.32.PICT
  ENDOF
  2 OF PROCEDURAL? ON
     ASCII MDPL CREATOR !
     (WRITE.PICT) ENDOF
  3 OF PROCEDURAL? OFF
      ASCII ST/8 CREATOR !
     (WRITE.PICT) ENDOF
  4 OF
    ASCII ARTZ CREATOR !
    CREATE.EPS.FILE ENDOF
  5 OF
    ASCII XCEL CREATOR !
    WRITE.INFO.FILE ENDOF
  6 OF
    WRITE.RENDERMAN
    ENDOF
  7 OF
    WRITE.DXF.FILE
    ENDOF
  8 OF
    WRITE.ISAAC.FILE
    ENDOF
  9 OF
    WRITE.SCREEN.DISPLAY
    ENDOF
  endcase
  THIS.PRO PROCEDURAL? !
  ASCII SWVL CREATOR !
  init.cursor ;


NULL.TOKEN CONSTANT PICS.SAVE
NULL.TOKEN CONSTANT SCRAP.SAVE
```

```
\ render.man output for swivel

anew -renderman-

508 MakeSwapOver WRITE.RENDERMAN

StartSwapOver


decimal

0 CONSTANT ^RENDER.NODE
30001 CONSTANT TREE.ERROR

Global Ri.FILE
Global Ri.POINTER
Create RiString 256 allot

: "Replace
  LOCALS| THE.STRING |
  THE.STRING C@ 0 DO
     THE.STRING 1+ I+ C@
     ASCII ' = IF
      Ascii " THE.STRING 1+ I+ C!
     THEN
     THE.STRING 1+ I+ C@
     ASCII ^ = IF
      13 THE.STRING 1+ I+ C!
     THEN
  LOOP ;


create "cr 1 c, 13 c,

create 'cr 2 c, ascii " c, 13 c,

create "EndArg  ," ]^"
"EndArg "Replace

create "version ," version 3.02^"
"version "Replace

create "ortho  ," 'orthographic'"
"ortho "Replace

create "perspec ," 'perspective'"
"perspec "Replace

create "P 4 C, ascii "P"[ ,
create "N 4 C, ascii "N"[ ,

create "Ks[  ," 'Ks' ["
"Ks[ "Replace

create "]Kd[  ," ]'Kd' ["
"]Kd[ "Replace

create "light ," light 'distantlight' "
"light "Replace

create "intensity ," 'intensity' ["
"intensity "Replace

create "lightvec  ," ]'from' [0 0 0 'to' ["
```

-000835

```
"lightvec "Replace

create "surface ," surface '"
"surface "Replace

create "plastic  ," plastic' "
"plastic "Replace


\ string handling for text file

: ADD.FILE.STRING
  LOCALS| THE.STRING |
  ERROR.FLAG 0= IF
    THE.STRING 1+ THE.STRING C@ RI.POINTER RI.FILE WRITE.VIRTUAL
    THE.STRING C@ RI.POINTER + TO RI.POINTER
    IO-RESULT @ TO ERROR.FLAG
  THEN ;

 : ADD.FILE.INTEGER
  LOCALS| THE.NUM |
  RiString 255 BLANKS
  THE.NUM RiString #>$!
  RiString ADD.FILE.STRING ;

 : ADD.FILE.FIXED
  LOCALS| THE.NUM |
  RiString 255 BLANKS
  THE.NUM RiString FIXED>MEASURES!
  RiString ADD.FILE.STRING
  ;

 : ADD.FILE.MEASURE
  LOCALS| THE.NUM |
  RiString 255 BLANKS
  THE.NUM RiString MEASURE>MEASURES!
  RiString ADD.FILE.STRING
  ;

: ADD.FILE.ANGLE
  LOCALS| THE.NUM |
  RiString 255 BLANKS
  THE.NUM RiString ANGLE>MEASURES!
  RiString ADD.FILE.STRING
  ;

 : Sp, "  " ADD.FILE.STRING ;


 : MakeRiMesh
   O.CENTER 12 LPLUCK
   AllPoints 8 +
   Locals| AllPointer Offz Offy Offx
   AllPoints @ AllPoints 4- @ * 0 do
     AllPointer @ Offz - neg AllPointer  !
     AllPointer 4+  @ Offy - neg AllPointer 4+ !
     AllPointer 8 +  @ Offx - AllPointer 8 +  !
     AllPointer 3Point.Length + to AllPointer
   loop  ;


: RiObjectShader
  OBJECT.MATERIAL.NAME drop " plastic" -string 0= if
    "surface          ADD.FILE.STRING
```

-000836

```
    "plastic        ADD.FILE.STRING
    "Ks[          ADD.FILE.STRING
    OBJECT.SPECULAR.SCALE pluck
    1000 color.scale */   ADD.FILE.MEASURE
    "]Kd[         ADD.FILE.STRING
    OBJECT.Direct.SCALE pluck
      1000 color.scale */   ADD.FILE.MEASURE
    "EndArg         ADD.FILE.STRING
  else
    "surface          ADD.FILE.STRING
    OBJECT.MATERIAL.NAME drop ADD.FILE.STRING
    'CR           ADD.FILE.STRING
  then ;

\ writes transformation for this object node

 : RiObjectTranslate
  Object.R3Pos Pluck
  Object.RCos Pluck 3angle
  Object.RScale Pluck 1000 scale.range */round
  locals| the.scale the.yaw the.pitch the.roll the.z the.y the.x |
  " translate "   ADD.FILE.STRING
    the.x      ADD.FILE.FIXED  Sp,
    the.y neg   ADD.FILE.FIXED  Sp,
    the.z neg   ADD.FILE.FIXED
    "cr      ADD.FILE.STRING
    " rotate "  ADD.FILE.STRING
    the.yaw     ADD.FILE.ANGLE
    "  0 1 0"   ADD.FILE.STRING
    "cr      ADD.FILE.STRING
     " rotate "   ADD.FILE.STRING
    the.pitch   ADD.FILE.ANGLE
    "  1 0 0"   ADD.FILE.STRING
    "cr        ADD.FILE.STRING
    " rotate "  ADD.FILE.STRING
    the.roll neg  ADD.FILE.ANGLE
    "  0 0 1"   ADD.FILE.STRING
    "cr        ADD.FILE.STRING
    " scale "   ADD.FILE.STRING
    the.scale   ADD.FILE.MEASURE Sp,
    the.scale   ADD.FILE.MEASURE Sp,
    the.scale   ADD.FILE.MEASURE
    "cr        ADD.FILE.STRING
    ;

\ outputs object color

  : RiObjectColor
   Object.RGBColor drop @rgb
   locals| The.blue the.green the.red
   " color ["    ADD.FILE.STRING
     The.red 1000 color.scale */round
           ADD.FILE.MEASURE sp,
     The.green 1000 color.scale */round
           ADD.FILE.MEASURE sp,
     The.blue 1000 color.scale */round
           ADD.FILE.MEASURE
   "EndArg     ADD.FILE.STRING  ;

\ writes a single 3point to the file

 : RiWritePoint
```

-000837

```
 locals| the.point |
 the.point 8+ @ ADD.FILE.FIXED  SP,
 the.point 4+ @ ADD.FILE.FIXED  SP,
 the.point    @ ADD.FILE.FIXED ;

: RiWriteNegPoint
 locals| the.point |
 the.point    @ neg ADD.FILE.FIXED  SP,
 the.point 4+ @ neg ADD.FILE.FIXED SP,
 the.point 8+ @ neg ADD.FILE.FIXED ;


: RENDER.FLAT.SECTION
 LOCALS| THE.POINTS |
 ALLPOINTS 4+ @ 1 DO
   " polygon " ADD.FILE.STRING
   "P      ADD.FILE.STRING
   THE.POINTS RiWritePoint SP,
   THE.POINTS 3POINT.LENGTH - RiWritePoint SP,
   THE.POINTS 3POINT.LENGTH -
     ALLPOINTS 4+ @ 3POINT.LENGTH * - RiWritePoint SP,
   THE.POINTS
     ALLPOINTS 4+ @ 3POINT.LENGTH * - RiWritePoint
   "EndArg   ADD.FILE.STRING
   THE.POINTS 3POINT.LENGTH -
   TO THE.POINTS
 LOOP ;


: RENDER.PHONG.SECTION
 LOCALS| THE.POINTS THE.NPOINTS |
 allpoints 4+ @ 1 DO
   " polygon "   ADD.FILE.STRING              \ start poly call
   "P        ADD.FILE.STRING
   THE.POINTS                    RiWritePoint SP,  \ write poly points
   THE.POINTS 3POINT.LENGTH -        RiWritePoint SP,
   THE.POINTS 3POINT.LENGTH -
     ALLPOINTS 4+ @ 3POINT.LENGTH * -  RiWritePoint SP,
   THE.POINTS
     ALLPOINTS 4+ @ 3POINT.LENGTH * -  RiWritePoint
   " ] "   ADD.FILE.STRING

   "N    ADD.FILE.STRING
   THE.NPOINTS                   RiWriteNegPoint SP, \ write normal points
   THE.NPOINTS 3POINT.LENGTH -       RiWriteNegPoint SP,
   THE.NPOINTS 3POINT.LENGTH -
     ALLPOINTS 4+ @ 3POINT.LENGTH * -  RiWriteNegPoint SP,
   THE.NPOINTS
     ALLPOINTS 4+ @ 3POINT.LENGTH * -  RiWriteNegPoint

   "EndArg     ADD.FILE.STRING
   THE.POINTS 3POINT.LENGTH +
   TO THE.POINTS
   THE.NPOINTS 3POINT.LENGTH +
   TO THE.NPOINTS
 LOOP ;


: RiFrontCap                          \ write the front cap to file
  LOCALS| THE.POINTS
  " gpolygon [" ADD.FILE.STRING     \ start general poly call
  ALLPOINTS 4+ @ 1- ADD.FILE.INTEGER
  " ] "         ADD.FILE.STRING
  "P          ADD.FILE.STRING
```

-300838

```
  ALLPOINTS 4+ @ 2 DO
    THE.POINTS RiWritePoint SP,         \ call the points
    THE.POINTS 3POINT.LENGTH +
    TO THE.POINTS
  LOOP
  THE.POINTS RiWritePoint
  "EndArg   ADD.FILE.STRING           \ end the call
  ;


: RiBackCap                     \ write the back cap to file
  LOCALS| THE.POINTS |
  THE.POINTS
  ALLPOINTS 4+ @ 1- 3point.length * +      \ write this one backwards
  TO THE.POINTS
  " gpolygon [" ADD.FILE.STRING       \ start general poly call
  ALLPOINTS 4+ @ 1- ADD.FILE.INTEGER
  " ] "       ADD.FILE.STRING
  "P          ADD.FILE.STRING
  ALLPOINTS 4+ @ 2 DO
    THE.POINTS RiWritePoint SP,         \ call out the points
    THE.POINTS 3POINT.LENGTH -
    TO THE.POINTS
  LOOP
  THE.POINTS RiWritePoint
  "EndArg   ADD.FILE.STRING           \ end the call
  ;


: RiRenderSection                  \ write any section to rip file
  locals| the.points |
  object.render pluck Phong = if
    normalpoints the.points +
    allpoints the.points +
    Render.phong.section
  else
    allpoints the.points +
    Render.flat.section
  then ;


: RiRenderMesh                     \ render a mesh to rip file
  0 locals| the.points |
  allpoints @ 1 > if
    object.form.render pluck front.cap.bit and if
      allpoints 8+ allpoints 4+ @ 3point.length * -
      RiFrontCap
    else
      8 RiRenderSection
    then
  then
  allpoints @ 3 > if
    allpoints 4+ @ 3point.length * 8 +
    to the.points
    allpoints @ 3- 0 do
      the.points RiRenderSection
      the.points
      allpoints 4+ @ 3point.length * -
      to the.points
    loop
  then
  allpoints @ 2 > if
    object.form.render pluck BACK.CAP.BIT and if
      allpoints 8+
```

```
      allpoints @ 2 -
      allpoints 4+ @ 3point.length * * -
      RiBackCap
    else
      allpoints @ 2 -
      allpoints 4+ @ 3point.length * * 8 +
      RiRenderSection
    then
  then ;


: RiMeshForm
 Get.Object
 object.render PLUCK
 Phong = IF
   SET.ALLNORMALS
   MAKE.AVERAGE.NORMALS
 then
 RiRenderMesh ;


: RiFlatPoly
 O.CENTER 12 LPLUCK                    \ write a single poly to file
 locals| Offz Offy Offx the.count the.points |
 " gpolygon [" ADD.FILE.STRING
 the.count     ADD.FILE.INTEGER
 " ] "       ADD.FILE.STRING
  "P       ADD.FILE.STRING
 the.count  1- 0 DO
   the.points I 3POINT.LENGTH * -      @
     Offz - neg   ADD.FILE.FIXED SP,
   the.points I 3POINT.LENGTH * - 4 + @
     Offy - neg  ADD.FILE.FIXED SP,
   the.points I 3POINT.LENGTH * - 8 + @
     Offx -    ADD.FILE.FIXED SP,
 LOOP
 the.points the.count 1-
   3POINT.LENGTH * -      @ Offz - neg  ADD.FILE.FIXED SP,
 the.points the.count 1-
   3POINT.LENGTH * + 4 + @ Offy - neg  ADD.FILE.FIXED SP,
 the.points the.count 1-
   3POINT.LENGTH * + 8 + @ Offx -  ADD.FILE.FIXED
 "EndArg ADD.FILE.STRING ;


: RiPolyForm
 Get.Object
 object.type drop
 locals| the.list |
 begin the.list w@ while
   the.list 2+ the.list w@ RiFlatPoly
   the.list w@ 12 * 2 +
   the.list + to the.list
 repeat ;

: RiPolyNormalForm
 Get.Object
 object.type drop
 locals| the.list |
 begin the.list w@ while
   the.list 2+ the.list w@ RiFlatPoly
   the.list w@ 24 * 2 +
   the.list + to the.list
 repeat ;
```

-000840

```
: RiObjectForm
 object.form pluck case
   path.form of
     Get.Object
     Three.list
     MakeRiMesh
     RiMeshForm  endof
   mesh.form of
     Get.Object
     MakeRiMesh
     RiMeshForm  endof
   poly.form of
     RiPolyForm endof
   polynormal.form of
     RiPolyNormalForm endof
 endcase ;

: RiRenderObject
 SET.WATCH.CURSOR
 RiObjectTranslate
 RiObjectColor
 RiObjectShader
 RiObjectForm  ;

: RiTransformBegin
  " transformbegin"   ADD.FILE.STRING
  "cr        ADD.FILE.STRING ;

: RiTransformEnd
  " transformend"   ADD.FILE.STRING
  "cr        ADD.FILE.STRING ;
: RiObjectBegin ;

: RiObjectEnd ;

: RiRenderNode                   ( does operations down the tree)
  CURRENT.OBJECT @
  LOCALS| C.OBJECT NODE.INDEX |
  NODE.INDEX THE.END = NOT ERROR.FLAG 0= AND IF
     NODE.INDEX SET.CURRENT.OBJECT
   REAL.OBJECT? IF
     RiObjectBegin
     RiTransformBegin
     RiRenderObject
     DOWN.TREE PLUCK  ^RENDER.NODE EXECUTE
     RiTransformEnd
     RiObjectEnd
     RIGHT.TREE PLUCK ^RENDER.NODE EXECUTE
   ELSE
     TREE.ERROR TO ERROR.FLAG
     THEN
   C.OBJECT SET.CURRENT.OBJECT
 THEN ;

 FIND RiRenderNode ' ^RENDER.NODE !
```

-000941

```
: transform.world
 Object.R3Pos Pluck
 Object.RCos Pluck 3angle
```

```
  Object.RScale Pluck 1000 scale.range */round
  locals| the.scale the.yaw the.pitch the.roll the.z the.y the.x
  " translate "   ADD.FILE.STRING
    the.x     ADD.FILE.FIXED  Sp,
    the.y neg   ADD.FILE.FIXED  Sp,
    the.z cdistance @ - neg
          ADD.FILE.FIXED
    "cr     ADD.FILE.STRING
    " rotate "  ADD.FILE.STRING
    the.yaw     ADD.FILE.ANGLE
    "  0 1 0"   ADD.FILE.STRING
    "cr     ADD.FILE.STRING
     " rotate "   ADD.FILE.STRING
    the.pitch   ADD.FILE.ANGLE
    "  1 0 0"   ADD.FILE.STRING
    "cr       ADD.FILE.STRING
    " rotate "  ADD.FILE.STRING
    the.roll neg  ADD.FILE.ANGLE
    "  0 0 1"   ADD.FILE.STRING
    "cr       ADD.FILE.STRING
    " scale "   ADD.FILE.STRING
    the.scale   ADD.FILE.MEASURE Sp,
    the.scale   ADD.FILE.MEASURE Sp,
    the.scale neg ADD.FILE.MEASURE
    "cr       ADD.FILE.STRING  ;

global LightNumber

: RiAddLight
  "light        add.file.string
  LightNumber     ADD.FILE.INTEGER sp,
  LightNumber 1+
  to LightNumber
  "intensity      add.file.string
  Direct.Scale @ 1000
  color.scale */ROUND ADD.FILE.MEASURE
  "lightvec       add.file.string
  light.vector
  to.stack rot
  1000 Cos.Scaler */ROUND ADD.FILE.MEASURE sp,
  swap neg
  1000 Cos.Scaler */ROUND ADD.FILE.MEASURE sp,
  1000 Cos.Scaler */ROUND ADD.FILE.MEASURE
  "EndArg       add.file.string
  ;


: RiAddLights
  current.light @ light.record /
  locals| the.light |
  1 to LightNumber
  lights# 0 do
    I setcurrentlight
    Light.Type @ if
      RiAddLight
    then
  loop
  the.light setcurrentlight ;


: RiRenderWorld
  0 to error.flag
  " worldbegin" ADD.FILE.STRING
  "CR       ADD.FILE.STRING
```

-000842

```
 RiAddLights
 world.object set.current.object
 RiTransformBegin
 transform.world
 down.tree pluck RiRenderNode
 RiTransformEnd
 " worldend"   ADD.FILE.STRING
 "CR       ADD.FILE.STRING  ;


: RiAspect
 " frameaspectratio " ADD.FILE.STRING
 ZBUFFERX @ 1000
 ZBUFFERY @ */ROUND   ADD.FILE.MEASURE
 "CR          ADD.FILE.STRING ;


: RiFormat
 " format "  ADD.FILE.STRING
 ZBUFFERX @  ADD.FILE.INTEGER sp,
 ZBUFFERY @  ADD.FILE.INTEGER sp,
 1     ADD.FILE.INTEGER
 "CR     ADD.FILE.STRING ;


: RiFrameCamera
 CDistance @
 Zbufferx @ Fix.Scale Scale
 Zbuffery @ Fix.Scale Scale
 0 0 locals| Width Fov FrameHeight FrameWidth FocalLength
 Orthographic @ if
   " projection "        ADD.FILE.STRING
   "ortho            ADD.FILE.STRING
   "cr             ADD.FILE.STRING
   " screenwindow "      ADD.FILE.STRING
   FrameWidth  2/ neg        ADD.FILE.FIXED Sp,
   FrameWidth  2/          ADD.FILE.FIXED Sp,
   FrameHeight 2/ neg      ADD.FILE.FIXED Sp,
   FrameHeight 2/        ADD.FILE.FIXED
   "Cr             ADD.FILE.STRING
 else
   " projection "        ADD.FILE.STRING
   "perspec          ADD.FILE.STRING
   "cr             ADD.FILE.STRING
   " screenwindow "      ADD.FILE.STRING
   FrameWidth 2/ 1000 FocalLength */Round
   to Fov
   FrameWidth 1000 FrameHeight */round
   to Width
   Fov Width 1000 */round neg  ADD.FILE.MEASURE Sp,
   Fov Width 1000 */round    ADD.FILE.MEASURE Sp,
   Fov neg           ADD.FILE.MEASURE Sp,
   Fov             ADD.FILE.MEASURE
   "Cr             ADD.FILE.STRING
 then
 ;

 : RiClip
   " clipping "  ADD.FILE.STRING
   hitherplane @   ADD.FILE.FIXED SP,
   yonplane @    ADD.FILE.FIXED
   "CR       ADD.FILE.STRING ;
```

-000843

```
: RiDocHeader
  "version  ADD.FILE.STRING
  RiFormat
  RiAspect
  RiFrameCamera
  RiClip
  ;


: (WriteRenderMan)
  0 locals| RiFile |
  0 to error.flag
  " .rip" append.title
  23 203 ResString      \ " RenderMan File "
  ascii TEXT                        \ set default file
  new.temp.file to Ri.File
  Ri.File if
    0 to Ri.Pointer
    error.flag 0= if
      SET.WATCH.CURSOR
      RiDocHeader
      RiRenderWorld
      init.cursor
    then
    ri.file close
  then ;

SetSwapOverToken
EndSwapOver
```

```
\ render.man output for swivel

anew -renderman-

508 MakeSwapOver WRITE.RENDERMAN

StartSwapOver


decimal

0 CONSTANT ^RENDER.NODE
30001 CONSTANT TREE.ERROR

Global Ri.FILE
Global Ri.POINTER
Create RiString 256 allot

: "Replace
  LOCALS| THE.STRING |
  THE.STRING C@ 0 DO
     THE.STRING 1+ I+ C@
     ASCII ' = IF
      Ascii " THE.STRING 1+ I+ C!
     THEN
     THE.STRING 1+ I+ C@
     ASCII ^ = IF
      13 THE.STRING 1+ I+ C!
     THEN
   LOOP ;


create "cr 1 c, 13 c,

create 'cr 2 c, ascii " c, 13 c,

create Paren 1 c, ascii " c,
create SpParen 2 c, 32 c, ascii " c,
create ParenSp[  3 c, ascii " c, 32 c, ascii [ c,
create "] 1 c, ascii ] c,

create "EndArg  ," ]^"
"EndArg "Replace

create "RibStructure ," ##RenderMan RIB-Structure 1.1^"
"RibStructure "Replace

create "version ," version 3.03^"
"version "Replace

create "RibScene ," ##Scene"
"RibScene "Replace

create "Frames   ," ##Frames 1^"
"Frames "Replace

create "ortho  ," 'orthographic'"
"ortho "Replace

create "perspec ," 'perspective' 'fov' ["
"perspec "Replace


create "P 4 C, ascii "P"[ ,
```

=000845

```
create "N 4 C, ascii "N"[ ,

create "Ks[  ," 'Ks' ["
"Ks[ "Replace

create "]Kd[  ," ]'Kd' ["
"]Kd[ "Replace

create "light ," light 'distantlight' "
"light "Replace

create "intensity ," 'intensity' ["
"intensity "Replace

create "lightvec  ," ]'from' [0 0 0;'to' ["
"lightvec "Replace

create "surface ," surface '"
"surface "Replace

create "plastic  ," plastic' "
"plastic "Replace

create "attbegin ," attributebegin^"
"attbegin "Replace

create "attend ," attributeend^"
"attend "Replace

create "endName ," '^"
"endName "Replace

create "attname ," attribute 'identifier' 'name' '"
"attname "Replace

create "shadename ," attribute 'identifier' 'shadinggroup' '"
"shadename "Replace

create "shade ," shade"

create "sides1 ," sides 1^"
"sides1 "Replace

create "sides2 ," sides 2^"
"sides2 "Replace

\ string handling for text file

: ADD.FILE.STRING
  LOCALS| THE.STRING
  ERROR.FLAG 0= IF
    THE.STRING 1+ THE.STRING C@ RI.POINTER RI.FILE WRITE.VIRTUAL
    THE.STRING C@ RI.POINTER + TO RI.POINTER
    IO-RESULT @ TO ERROR.FLAG
  THEN ;

 : ADD.FILE.INTEGER
  LOCALS| THE.NUM |
  RiString 255 BLANKS
  THE.NUM RiString #>S!
  RiString ADD.FILE.STRING ;

 : ADD.FILE.FIXED
  LOCALS| THE.NUM |
```

-000946

```
 RiString 255 BLANKS
 THE.NUM RiString FIXED>MEASURES!
 RiString ADD.FILE.STRING
 ;

: ADD.FILE.MEASURE
 LOCALS| THE.NUM |
 RiString 255 BLANKS
 THE.NUM RiString MEASURE>MEASURES!
 RiString ADD.FILE.STRING
 ;

: ADD.FILE.ANGLE
 LOCALS| THE.NUM |
 RiString 255 BLANKS
 THE.NUM RiString ANGLE>MEASURES!
 RiString ADD.FILE.STRING
 ;

: Sp, "  " ADD.FILE.STRING ;

: MakeRiMesh
   O.CENTER 12 LPLUCK
   AllPoints 8 +
   Locals| AllPointer Offz Offy Offx
   AllPoints @ AllPoints 4+ @ * 0 do
     AllPointer @ Offz - neg AllPointer !
     AllPointer 4+  @ Offy - neg AllPointer 4+ !
     AllPointer 8 +  @ Offx - AllPointer 8 + !
     AllPointer 3Point.Length + to AllPointer
   loop ;

: RiObjectShader
 0 0 0 0 locals| theString theRange thePtr shaderRec
   ASCII ZSHD CurrentShader @ 1-
   Get.Resource to shaderRec
   shaderRec if
     "surface         ADD.FILE.STRING
     shaderRec @      ADD.FILE.STRING
     Paren          ADD.FILE.STRING
     shaderRec @ to thePtr
     shaderRec @ c@ 1+ thePtr + to thePtr
     thePtr 4+ @ if              \ test for Ks use
       SpParen        ADD.FILE.STRING
       " Ks"       ADD.FILE.STRING
       ParenSp[       ADD.FILE.STRING
       OBJECT.SPECULAR.SCALE pluck
       1000 color.scale */ ADD.FILE.MEASURE
       "]          ADD.FILE.STRING
     then
     thePtr @ if               \ test for Ka use
       SpParen        ADD.FILE.STRING
       " Ka"       ADD.FILE.STRING
       ParenSp[       ADD.FILE.STRING
       OBJECT.Direct.SCALE pluck
       1000 color.scale */ ADD.FILE.MEASURE
       "]          ADD.FILE.STRING
     then
     shaderRec 0 GetShaderRec to thePtr
     thePtr @ to theRange
```

-000947

```
    thePtr 8 + to thePtr
    thePtr c@ 1+ thePtr + to theString
    theString c@ if
      SpParen       ADD.FILE.STRING
      theString       ADD.FILE.STRING
      ParenSp[      ADD.FILE.STRING
      CurrentMaterial @
      +ShaderVar1 @
      1000 color.scale */
      theRange  *     ADD.FILE.MEASURE
      "]          ADD.FILE.STRING
    then

    shaderRec 1 GetShaderRec to thePtr
    thePtr @ to theRange
    thePtr 8 + to thePtr
    thePtr c@ 1+ thePtr + to theString
    theString c@ if
      SpParen       ADD.FILE.STRING
      theString       ADD.FILE.STRING
      ParenSp[      ADD.FILE.STRING
      CurrentMaterial @
      +ShaderVar2 @
      1000 color.scale */
      theRange  *     ADD.FILE.MEASURE
      "]          ADD.FILE.STRING
    then

    shaderRec 2 GetShaderRec to thePtr
    thePtr @ to theRange
    thePtr 8 + to thePtr
    thePtr c@ 1+ thePtr + to theString
    theString c@ if
      SpParen       ADD.FILE.STRING
      theString       ADD.FILE.STRING
      ParenSp[      ADD.FILE.STRING
      CurrentMaterial @
      +ShaderVar3 @
      1000 color.scale */
      theRange  *     ADD.FILE.MEASURE
      "]          ADD.FILE.STRING
    then

    shaderRec 3 GetShaderRec to thePtr
    thePtr @ to theRange
    thePtr 8 + to thePtr
    thePtr c@ 1+ thePtr + to theString
    theString c@ if
      SpParen       ADD.FILE.STRING
      theString       ADD.FILE.STRING
      ParenSp[      ADD.FILE.STRING
      CurrentMaterial @
      +ShaderVar4 @
      1000 color.scale */
      theRange  *     ADD.FILE.MEASURE
      "]          ADD.FILE.STRING
    then
    "cr ADD.FILE.STRING
  then ;

\ writes transformation for this object node

 : RiObjectTranslate
```

-000848

```
Object.R3Pos Pluck
Object.RCos Pluck 3angle
Object.RScale Pluck 1000 scale.range */round
locals| the.scale the.yaw the.pitch the.roll the.z the.y the.x |
" translate "   ADD.FILE.STRING
  the.x      ADD.FILE.FIXED  Sp,
  the.y neg   ADD.FILE.FIXED  Sp,
  the.z neg   ADD.FILE.FIXED
  "cr     ADD.FILE.STRING
  " rotate "  ADD.FILE.STRING
  the.yaw     ADD.FILE.ANGLE
  "  0 1 0"   ADD.FILE.STRING
  "cr     ADD.FILE.STRING
   " rotate "   ADD.FILE.STRING
  the.pitch   ADD.FILE.ANGLE
  "  1 0 0"   ADD.FILE.STRING
  "cr       ADD.FILE.STRING
  " rotate "  ADD.FILE.STRING
  the.roll neg  ADD.FILE.ANGLE
  "  0 0 1"   ADD.FILE.STRING
  "cr       ADD.FILE.STRING
  " scale "   ADD.FILE.STRING
  the.scale   ADD.FILE.MEASURE Sp,
  the.scale   ADD.FILE.MEASURE Sp,
  the.scale   ADD.FILE.MEASURE
  "cr       ADD.FILE.STRING
  ;

\ outputs object color

 : RiObjectColor
  Object.RGBColor drop @rgb
  0  locals| theScale The.blue the.green the.red

  CurrentMaterial @  +opacity @ to theScale

  " color ["    ADD.FILE.STRING
    The.red 1000 color.scale */round
          ADD.FILE.MEASURE sp,
    The.green 1000 color.scale */round
          ADD.FILE.MEASURE sp,
    The.blue 1000 color.scale */round
          ADD.FILE.MEASURE
  "EndArg     ADD.FILE.STRING
  " opacity ["    ADD.FILE.STRING
    thescale 1000 color.scale */round
          ADD.FILE.MEASURE sp,
    thescale 1000 color.scale */round
          ADD.FILE.MEASURE sp,
    thescale 1000 color.scale */round
          ADD.FILE.MEASURE
  "EndArg     ADD.FILE.STRING   ;


\ writes a single 3point to the file

 : RiWritePoint
  locals| the.point |
  the.point 8+ @ ADD.FILE.FIXED  SP,
  the.point 4+ @ ADD.FILE.FIXED  SP,
  the.point    @ ADD.FILE.FIXED ;

 : RiWriteNegPoint
  locals| the.point |
```

-000849

```
the.point    @ neg ADD.FILE.FIXED  SP,
the.point 4+ @ neg ADD.FILE.FIXED SP,
the.point 8+ @ neg ADD.FILE.FIXED ;


: RENDER.FLAT.SECTION
LOCALS| THE.POINTS |
ALLPOINTS 4+ @ 1 DO
  " polygon " ADD.FILE.STRING
  "P      ADD.FILE.STRING
  THE.POINTS RiWritePoint SP,
  THE.POINTS 3POINT.LENGTH + RiWritePoint SP,
  THE.POINTS 3POINT.LENGTH -
    ALLPOINTS 4+ @ 3POINT.LENGTH * - RiWritePoint SP,
  THE.POINTS
    ALLPOINTS 4+ @ 3POINT.LENGTH * - RiWritePoint
  "EndArg   ADD.FILE.STRING
  THE.POINTS 3POINT.LENGTH -
  TO THE.POINTS
LOOP ;


: RENDER.PHONG.SECTION
LOCALS| THE.POINTS THE.NPOINTS
allpoints 4+ @ 1 DO
  " polygon "   ADD.FILE.STRING            \ start poly ca..
  "P        ADD.FILE.STRING
  THE.POINTS                    RiWritePoint SP,  \ write poly points
  THE.POINTS 3POINT.LENGTH -        RiWritePoint SP,
  THE.POINTS 3POINT.LENGTH -
    ALLPOINTS 4+ @ 3POINT.LENGTH * -  RiWritePoint SP,
  THE.POINTS
    ALLPOINTS 4+ @ 3POINT.LENGTH * -  RiWritePoint
  " ] "   ADD.FILE.STRING

  "N    ADD.FILE.STRING
  THE.NPOINTS                   RiWriteNegPoint SP, \ write normal points
  THE.NPOINTS 3POINT.LENGTH +       RiWriteNegPoint SP,
  THE.NPOINTS 3POINT.LENGTH +
    ALLPOINTS 4+ @ 3POINT.LENGTH * -  RiWriteNegPoint SP,
  THE.NPOINTS
    ALLPOINTS 4+ @ 3POINT.LENGTH * -  RiWriteNegPoint

  "EndArg     ADD.FILE.STRING
  THE.POINTS 3POINT.LENGTH -
  TO THE.POINTS
  THE.NPOINTS 3POINT.LENGTH -
  TO THE.NPOINTS
LOOP ;


: RiFrontCap                    \ write the front cap to file
  LOCALS| THE.POINTS |
  " gpolygon ["   ADD.FILE.STRING     \ start general poly call
  ALLPOINTS 4+ @ 1- ADD.FILE.INTEGER
  " ] "         ADD.FILE.STRING
  "P          ADD.FILE.STRING
  ALLPOINTS 4+ @ 2 DO
    THE.POINTS RiWritePoint SP,       \ call the points
    THE.POINTS 3POINT.LENGTH -
    TO THE.POINTS
  LOOP
  THE.POINTS RiWritePoint
  "EndArg   ADD.FILE.STRING         \ end the call
```

-300850

```
;

: RiBackCap                    \ write the back cap to file
  LOCALS| THE.POINTS |
  THE.POINTS
  ALLPOINTS 4+ @ 1- 3point.length * -      \ write this one backwards
  TO THE.POINTS
  " gpolygon [" ADD.FILE.STRING       \ start general poly call
  ALLPOINTS 4+ @ 1- ADD.FILE.INTEGER
  " ] "       ADD.FILE.STRING
  "P          ADD.FILE.STRING
  ALLPOINTS 4+ @ 2 DO
    THE.POINTS RiWritePoint SP,       \ call out the points
    THE.POINTS 3POINT.LENGTH -
    TO THE.POINTS
  LOOP
  THE.POINTS RiWritePoint
  "EndArg   ADD.FILE.STRING          \ end the call
  ;

: RiRenderSection                  \ write any section to rip file
  locals| the.points |
  RENDER.MODE @ PHONG = if
    normalpoints the.points +
    allpoints the.points +
    Render.phong.section
  else
    allpoints the.points +
    Render.flat.section
  then ;

: RiRenderMesh                   \ render a mesh to rip file
  0 locals| the.points |
  allpoints @ 1 > if
    object.form.render pluck front.cap.bit and if
      allpoints 8+ allpoints 4+ @ 3point.length * +
      RiFrontCap
    else
      8 RiRenderSection
    then
  then
  allpoints @ 3 > if
    allpoints 4+ @ 3point.length * 8 -
    to the.points
    allpoints @ 3- 0 do
      the.points RiRenderSection
      the.points
      allpoints 4+ @ 3point.length * +
      to the.points
    loop
  then
  allpoints @ 2 > if
    object.form.render pluck BACK.CAP.BIT and if
      allpoints 8-
      allpoints @ 2 -
      allpoints 4+ @ 3point.length * * +
      RiBackCap
    else
      allpoints @ 2 -
      allpoints 4+ @ 3point.length * * 8 +
      RiRenderSection
```

```
    then
   then ;

 : RiMeshForm
  Get.Object
  object.render PLUCK
  Phong = IF
    SET.ALLNORMALS
    MAKE.AVERAGE.NORMALS
  then
  RiRenderMesh ;

 : RiFlatPoly
  O.CENTER 12 LPLUCK                    \ write a single poly to file
  locals| Offz Offy Offx the.count the.points  |
  " gpolygon [" ADD.FILE.STRING
  the.count      ADD.FILE.INTEGER
  " ] "        ADD.FILE.STRING
   "P        ADD.FILE.STRING
  the.count  1- 0 DO
    the.points I 3POINT.LENGTH * +      @
      Offz - neg   ADD.FILE.FIXED SP,
    the.points I 3POINT.LENGTH * + 4 + @
      Offy - neg  ADD.FILE.FIXED SP,
    the.points I 3POINT.LENGTH * + 8 + @
      Offx -    ADD.FILE.FIXED SP,
  LOOP
  the.points the.count 1-
    3POINT.LENGTH * +     @ Offz - neg  ADD.FILE.FIXED SP,
  the.points the.count 1-
    3POINT.LENGTH * + 4 + @ Offy - neg  ADD.FILE.FIXED SP,
  the.points the.count 1-
    3POINT.LENGTH * + 8 + @ Offx -  ADD.FILE.FIXED
  "EndArg ADD.FILE.STRING ;

 : RiPolyForm
  Get.Object
  object.type drop
  locals| the.list |
  begin the.list w@ while
    the.list 2+ the.list w@ RiFlatPoly
    the.list w@ 12 * 2 +
    the.list + to the.list
  repeat ;

 : RiPolyNormalForm
  Get.Object
  object.type drop
  locals| the.list |
  begin the.list w@ while
    the.list 2+ the.list w@ RiFlatPoly
    the.list w@ 24 * 2 +
    the.list + to the.list
  repeat ;

 : RiObjectForm
  OBJECT.FORM.RENDER pluck
  CULL.BACK.BIT and if
    "sides2 ADD.FILE.STRING
  else
```

-000852

```
    "sides1 ADD.FILE.STRING
  then
  object.form pluck case
    path.form of
      Get.Object
      Three.list
      MakeRiMesh
      RiMeshForm  endof
    mesh.form of
      Get.Object
      MakeRiMesh
      RiMeshForm  endof
    poly.form of
      RiPolyForm endof
    polynormal.form of
      RiPolyNormalForm endof
  endcase ;

: ObjectNameStr
  Object.String drop
  temp.string
  -1 locals| the.flag the.pad the.name
  0 the.pad c!
  20 0 do
    the.name i +  c@ 32 = if
      0 to the.flag
    then
    the.flag if
      the.pad c@ 1+ the.pad c!
      the.name i + c@
      the.pad i + 1 - c!
    then
  loop
  temp.string
  ;


: RiObjectBegin
  "attbegin      ADD.FILE.STRING
  "attname       ADD.FILE.STRING
  ObjectNameStr   ADD.FILE.STRING
  "endName     ADD.FILE.STRING
;

: RiObjectEnd
  "attend  ADD.FILE.STRING ;

: RiShadeBegin
  "attbegin      ADD.FILE.STRING
  "ShadeName     ADD.FILE.STRING
  ObjectNameStr   ADD.FILE.STRING
  "Shade       ADD.FILE.STRING
  "endName     ADD.FILE.STRING    ;

: RiShadeEnd
  "attend  ADD.FILE.STRING ;

: RiRenderObject
  RENDER.MODE @
  locals| themode |
  SET.WATCH.CURSOR
  GLOBAL.RENDER @ NOT IF          \ check for local render
    OBJECT.RENDER PLUCK
    RENDER.MODE !
```

-000853

```
THEN
RiObjectTranslate
RiShadeBegin
RiObjectColor
RiObjectShader
RiObjectForm
RiShadeEnd
themode RENDER.MODE !
;


: RiRenderNode                    ( does operations down the tree)
  CURRENT.OBJECT @
  LOCALS| C.OBJECT NODE.INDEX |
  NODE.INDEX THE.END = NOT ERROR.FLAG 0= AND IF
     NODE.INDEX SET.CURRENT.OBJECT
   REAL.OBJECT? IF
     OBJECT.MATERIAL.INDEX PLUCK
     setcurrentmaterial
     RiObjectBegin
     RiRenderObject
     DOWN.TREE PLUCK  ^RENDER.NODE EXECUTE
     RiObjectEnd
     RIGHT.TREE PLUCK ^RENDER.NODE EXECUTE
   ELSE
     TREE.ERROR TO ERROR.FLAG
     THEN
   C.OBJECT SET.CURRENT.OBJECT
 THEN ;

 FIND RiRenderNode ' ^RENDER.NODE !


: transform.world
 Object.R3Pos Pluck
 Object.RCos Pluck 3angle
 Object.RScale Pluck 1000 scale.range */round
 locals| the.scale the.yaw the.pitch the.roll the.z the.y the.x
 " translate "   ADD.FILE.STRING
   the.x     ADD.FILE.FIXED  Sp,
   the.y neg   ADD.FILE.FIXED  Sp,
   the.z cdistance @ - neg
         ADD.FILE.FIXED
   "cr     ADD.FILE.STRING
   " rotate "  ADD.FILE.STRING
   the.yaw     ADD.FILE.ANGLE
   "  0 1 0"   ADD.FILE.STRING
   "cr     ADD.FILE.STRING
    " rotate "   ADD.FILE.STRING
   the.pitch   ADD.FILE.ANGLE
   "  1 0 0"   ADD.FILE.STRING
   "cr       ADD.FILE.STRING
   " rotate "  ADD.FILE.STRING
   the.roll neg  ADD.FILE.ANGLE
   "  0 0 1"   ADD.FILE.STRING
   "cr       ADD.FILE.STRING
   " scale "   ADD.FILE.STRING
   the.scale   ADD.FILE.MEASURE Sp,
   the.scale   ADD.FILE.MEASURE Sp,
   the.scale neg ADD.FILE.MEASURE
   "cr       ADD.FILE.STRING  ;
```

-000854

```
global LightNumber

: RiAddLight
  "light        add.file.string
  LightNumber      ADD.FILE.INTEGER sp,
  LightNumber 1+
  to LightNumber
  "intensity       add.file.string
  Direct.Scale @ 1000
  color.scale */ROUND ADD.FILE.MEASURE
  "lightvec        add.file.string
  light.vector
  to.stack rot
  1000 Cos.Scaler */ROUND ADD.FILE.MEASURE sp,
  swap neg
  1000 Cos.Scaler */ROUND ADD.FILE.MEASURE sp,
  1000 Cos.Scaler */ROUND ADD.FILE.MEASURE
  "EndArg        add.file.string
  ;


: RiAddLights
  current.light @ light.record /
  locals| the.light |
  1 to LightNumber
  lights# 0 do
    I setcurrentlight
    Light.Type @ if
      RiAddLight
    then
  loop
  the.light setcurrentlight ;


: RiRenderWorld
  0 to error.flag
  " worldbegin" ADD.FILE.STRING
  "CR        ADD.FILE.STRING
  RiAddLights
  world.object set.current.object
  RiObjectBegin
  transform.world
  down.tree pluck RiRenderNode
  RiObjectEnd
  " worldend"   ADD.FILE.STRING
  "CR        ADD.FILE.STRING  ;

: CDISTANCE2Fov
  0 0 0 locals| base upright hype
  zbuffery @ 2/ to base
  Cdistance @ 1024 / to upright
  base upright  angle 900 swap -
  200 *
  ;


: RiFrameCamera
  CDistance @
  Zbufferx @ Fix.Scale Scale
  Zbuffery @ Fix.Scale Scale
  0 0 locals| Width Fov FrameHeight FrameWidth FocalLength
  Orthographic @ if
    " projection "        ADD.FILE.STRING
```

-000855

```
    "ortho          ADD.FILE.STRING
    "cr            ADD.FILE.STRING
  else
    " projection "        ADD.FILE.STRING
    "perspec          ADD.FILE.STRING
    CDISTANCE2Fov       ADD.FILE.MEASURE
    "EndArg           ADD.FILE.STRING
  then
  ;

  : RiClip
    " clipping "  ADD.FILE.STRING
    hitherplane @   ADD.FILE.FIXED SP,
    yonplane @    ADD.FILE.FIXED
    "CR      ADD.FILE.STRING ;


: RiDocHeader
  "RibStructure ADD.FILE.STRING
  "RibScene   ADD.FILE.STRING
  Output.title  ADD.FILE.STRING
  'cr       ADD.FILE.STRING
  "Frames     ADD.FILE.STRING
  "version    ADD.FILE.STRING
  RiFrameCamera
  RiClip
  ;


: (WriteRenderMan)
  0 locals| RiFile |
  0 to error.flag
  " .rib" append.title
  23 203 ResString      \ " RenderMan File "
  ascii TEXT                      \ set default file
  new.temp.file to Ri.File
  Ri.File if
    0 to Ri.Pointer
    error.flag 0= if
      SET.WATCH.CURSOR
      RiDocHeader
      RiRenderWorld
      init.cursor
    then
    ri.file close
  then ;

 SetSwapOverToken
 EndSwapOver
```

```
\ ZBUFF PANEL
\ LAST REVISION: 11/15/87  05:14:06 PM   YH

cr ." loading Zbuff Panel "

\ Anew ZBUFF.PANEL.STUFF


 5006  NEW.DIALOG.RECORD

   1 MAKE.ACTIVE.ITEM ZBUFF.OK
   2 MAKE.ACTIVE.ITEM ZBUFF.CANCEL
   3 MAKE.RADIO.ITEM ZBUFF.1
   4 MAKE.RADIO.ITEM ZBUFF.2
   5 MAKE.RADIO.ITEM ZBUFF.3
   6 MAKE.RADIO.ITEM ZBUFF.4
   7 MAKE.RADIO.ITEM ZBUFF.5
   8 MAKE.RADIO.ITEM ZBUFF.6
   9 MAKE.RADIO.ITEM ZBUFF.7
  10 MAKE.RADIO.ITEM ZBUFF.8
  11 MAKE.RADIO.ITEM ZBUFF.0SCALE
  12 MAKE.RADIO.ITEM ZBUFF.1SCALE
  13 MAKE.RADIO.ITEM ZBUFF.2SCALE
  14 MAKE.RADIO.ITEM ZBUFF.3SCALE

    NAME.DIALOG.RECORD  ZBUFF.PANEL

  -2 SET.ZSCALE
  1 ZBUFF.0SCALE !
  CREATE LAST.SCALE 0 ,

  1 ITEM.BANK.OF ZBUFF.0SCALE !
  1 ITEM.BANK.OF ZBUFF.1SCALE !
  1 ITEM.BANK.OF ZBUFF.2SCALE !
  1 ITEM.BANK.OF ZBUFF.3SCALE !



  CREATE THIS.ZBUFF  7 ,
  8000 constant MEM.CUSHION

  512 ZBUFFERX !
  384 ZBUFFERY !

  CREATE NOSAVE 0 ,

     : Z.BYE
     LOCALS| C.ITEM HIT.ITEM C.RECORD
     0 LAST.RADIO.ITEM !
   DROP 1
   -1 NOSAVE ! ;

  FIND Z.BYE ZBUFF.CANCEL !          \ set cancel to not effect buffer size


  : SET.ZBUFF.SIZE
    ZBUFFERY @ ZBUFFERX @
    LOCALS| THE.Y THE.X C.ITEM
      C.ITEM THIS.ZBUFF !
    C.ITEM 2- 8 MIN CASE
    1 OF  64    48   TO THE.Y TO THE.X ENDOF
    2 OF 128    96   TO THE.Y TO THE.X ENDOF
    3 OF 256   192   TO THE.Y TO THE.X ENDOF
```

-000857

```
4 OF 384  288   TO THE.Y TO THE.X ENDOF
  5 OF 512  384   TO THE.Y TO THE.X ENDOF
6 OF 640  480   TO THE.Y TO THE.X ENDOF
7 OF 768  576   TO THE.Y TO THE.X ENDOF
8 OF 1024 768   TO THE.Y TO THE.X ENDOF
ENDCASE
THE.X THE.Y ;


: HANDLE.ZBUFF.SIZE
  ZBUFFERY @ ZBUFFERX @
  3 LOCALS| THE.ITEM |
  ZBUFF.1 @ IF  3 TO THE.ITEM THEN
  ZBUFF.2 @ IF  4 TO THE.ITEM THEN
  ZBUFF.3 @ IF  5 TO THE.ITEM THEN
  ZBUFF.4 @ IF  6 TO THE.ITEM THEN
    ZBUFF.5 @ IF  7 TO THE.ITEM THEN
  ZBUFF.6 @ IF  8 TO THE.ITEM THEN
  ZBUFF.7 @ IF  9 TO THE.ITEM THEN
  ZBUFF.8 @ IF 10 TO THE.ITEM THEN
  THE.ITEM SET.ZBUFF.SIZE ;


: HANDLE.ZBUFF.SCALE
  LAST.SCALE @ LOCALS| THE.LAST
  ZBUFF.0SCALE @ IF -2 TO THE.LAST THEN
  ZBUFF.1SCALE @ IF -1 TO THE.LAST THEN
  ZBUFF.2SCALE @ IF  0 TO THE.LAST THEN
  ZBUFF.3SCALE @ IF  1 TO THE.LAST THEN
  LAST.SCALE @ THE.LAST = NOT IF
    THE.LAST LAST.SCALE !
    THE.LAST SET.ZSCALE
    WORLD.OBJECT TREE.CHANGED - CHANGED.FLAG !
  THEN  ;


: DO.ZBUFF.PANEL            \ Dialog.Record -- ZX ZY
  0 NOSAVE !
  INIT.CURSOR
  ZBUFF.PANEL
  LOCALS| C.DIALOG |
  0 LAST.RADIO.ITEM !          \ Init radio global
  C.DIALOG DIALOG.OF INIT.DIALOG    \ open dialog window , push dialog.ptr onto.stack
  C.DIALOG GET.ITEMS           \ Fetch item handles
    C.DIALOG SET.ITEMS          \ set booleans and text
  THIS.ZBUFF @ C.DIALOG HANDLE.ITEMS
  BEGIN
    DO.MODAL.DIALOG          \ handle modal events
      DUP C.DIALOG HANDLE.ITEMS    \ handle item events
  1 = UNTIL                 \ until ok
  C.DIALOG GET.ITEM.DATA         \ fetch new data to record
    QUIT.DIALOG              \ end of dialog
  NOSAVE @ 0 = if
    HANDLE.ZBUFF.SCALE
    HANDLE.ZBUFF.SIZE
  else
    ZBUFFERX @ ZBUFFERY @
  then  ;


FIND DO.ZBUFF.PANEL CONSTANT ^DO.ZBUFF.PANEL
```

-000958

T

^DO.ZBUFF.PANEL RECONFIG.TOKEN !

```
: SET.START.BACKPORTS
  7 LOCALS| START.SIZE |
  SET.VIEW.LIMITS        \ set the size of the port vars
  BEGIN
    START.SIZE
    SET.ZBUFF.SIZE
    ZBUFFERY !
    ZBUFFERX !
    Init.Poly.heap
     0 ?HEAP.SIZE MINHEAPSIZE
    ZBUFFERX @ OUTPUT.DEPTH  @ * 8/  ZBUFFERY @ * + < OR
    IF START.SIZE 1- TO START.SIZE
       0
    ELSE -1
    THEN
    START.SIZE 2 = OR
  UNTIL
  START.SIZE 2 = IF
    -108 TO ERROR.FLAG
    DO.ERROR.ALERT
    BYE
  THEN   ;
```

I

```
\ ZBUFF PANEL
\ LAST REVISION: 11/15/87  05:14:06 PM   YH

cr ." loading Zbuff Panel "

\ Anew ZBUFF.PANEL.STUFF


 5006  NEW.DIALOG.RECORD

   1 MAKE.ACTIVE.ITEM ZBUFF.OK
   2 MAKE.ACTIVE.ITEM ZBUFF.CANCEL
   3 MAKE.RADIO.ITEM ZBUFF.1
   4 MAKE.RADIO.ITEM ZBUFF.2
   5 MAKE.RADIO.ITEM ZBUFF.3
   6 MAKE.RADIO.ITEM ZBUFF.4
   7 MAKE.RADIO.ITEM ZBUFF.5
   8 MAKE.ACTIVE.ITEM ZBUFF.6
   9 MAKE.ACTIVE.ITEM ZBUFF.7
  10 MAKE.ACTIVE.ITEM ZBUFF.8
  11 MAKE.RADIO.ITEM ZBUFF.0SCALE
  12 MAKE.RADIO.ITEM ZBUFF.1SCALE
  13 MAKE.RADIO.ITEM ZBUFF.2SCALE
  14 MAKE.RADIO.ITEM ZBUFF.3SCALE

    NAME.DIALOG.RECORD  ZBUFF.PANEL

  1 SET.ZSCALE
  1 ZBUFF.1SCALE !
  CREATE LAST.SCALE 1 ,

  1 ITEM.BANK.OF ZBUFF.0SCALE !
  1 ITEM.BANK.OF ZBUFF.1SCALE !
  1 ITEM.BANK.OF ZBUFF.2SCALE !
  1 ITEM.BANK.OF ZBUFF.3SCALE !


  CREATE THIS.ZBUFF  7 ,

  512 ZBUFFERX !
  384 ZBUFFERY !


 CREATE NOSAVE 0 ,

     : Z.BYE
     LOCALS| C.ITEM HIT.ITEM C.RECORD
     0 LAST.RADIO.ITEM !
   DROP 1
   -1 NOSAVE ! ;

  FIND Z.BYE ZBUFF.CANCEL !         \ set cancel to not effect buffer size



  : SET.ZBUFF.SIZE
    ZBUFFERY @ ZBUFFERX @
    LOCALS| THE.Y THE.X C.ITEM
      C.ITEM THIS.ZBUFF !
    C.ITEM 2- 8 MIN CASE
    1 OF  64    48   TO THE.Y TO THE.X ENDOF
    2 OF 128    96   TO THE.Y TO THE.X ENDOF
    3 OF 256   192   TO THE.Y TO THE.X ENDOF
```

-000960

```
4 OF 384  288   TO THE.Y TO THE.X ENDOF
  5 OF 512  384   TO THE.Y TO THE.X ENDOF
ENDCASE
THE.X THE.Y ;


: HANDLE.ZBUFF.SIZE
  ZBUFFERY @ ZBUFFERX @
  3 LOCALS| THE.ITEM |
  ZBUFF.1 @ IF  3 TO THE.ITEM THEN
  ZBUFF.2 @ IF  4 TO THE.ITEM THEN
  ZBUFF.3 @ IF  5 TO THE.ITEM THEN
  ZBUFF.4 @ IF  6 TO THE.ITEM THEN
    ZBUFF.5 @ IF  7 TO THE.ITEM THEN
  THE.ITEM SET.ZBUFF.SIZE ;


: HANDLE.ZBUFF.SCALE
  LAST.SCALE @ LOCALS| THE.LAST
  ZBUFF.0SCALE @ IF  0 TO THE.LAST THEN
  ZBUFF.1SCALE @ IF  1 TO THE.LAST THEN
  ZBUFF.2SCALE @ IF  2 TO THE.LAST THEN
  ZBUFF.3SCALE @ IF  3 TO THE.LAST THEN
  LAST.SCALE @ THE.LAST = NOT IF
    THE.LAST LAST.SCALE !
    THE.LAST SET.ZSCALE
    WORLD.OBJECT TREE.CHANGED - CHANGED.FLAG !
  THEN   ;


: DO.ZBUFF.PANEL             \ Dialog.Record -- ZX ZY
  0 NOSAVE !
  INIT.CURSOR
  ZBUFF.PANEL
  LOCALS| C.DIALOG |
  0 LAST.RADIO.ITEM !          \ init radio global
  C.DIALOG DIALOG.OF INIT.DIALOG    \ open dialog window , push dialog.ptr ono.stack
  C.DIALOG GET.ITEMS           \ Fetch item handles
    C.DIALOG SET.ITEMS          \ set boleans and text
  THIS.ZBUFF @ C.DIALOG HANDLE.ITEMS
  BEGIN
    DO.MODAL.DIALOG           \ handle modal events
      DUP C.DIALOG HANDLE.ITEMS    \ handle item events
  1 = UNTIL                 \ until ok
  C.DIALOG GET.ITEM.DATA         \ fetch new data to record
    QUIT.DIALOG              \ end of dialog
  NOSAVE @ 0 = if
    HANDLE.ZBUFF.SCALE
    HANDLE.ZBUFF.SIZE
  else
    ZBUFFERX @ ZBUFFERY @
  then  ;


FIND DO.ZBUFF.PANEL CONSTANT ^DO.ZBUFF.PANEL
^DO.ZBUFF.PANEL RECONFIG.TOKEN !
```

000861

```
  : SET.START.BACKPORTS
    7 LOCALS| START.SIZE |
    SET.VIEW.LIMITS        \ set the size of the port vars
```

6/1/90 20:11 ZBUFF.PANEL.SMALL Page 3

```
BEGIN
  START.SIZE
  SET.ZBUFF.SIZE
  ZBUFFERY !
  ZBUFFERX !
  Init.Poly.heap
   0 ?HEAP.SIZE MINHEAPSIZE
  ZBUFFERX @ OUTPUT.DEPTH  @ * 8/  ZBUFFERY @ * + < OR
  IF START.SIZE 1- TO START.SIZE
     0
  ELSE -1
  THEN
  START.SIZE 2 = OR
UNTIL
START.SIZE 2 = IF
  -108 TO ERROR.FLAG
  DO.ERROR.ALERT
  BYE
THEN   ;
```

6/1/90 20:11 ZOOM.RECTS Page 1

```
\ zoom rects
\ Last Revision: 01/28/88  11:09:13 PM   YH

CR ." Loading Zoom Rects"


CREATE ZOOM.OUT.TOKEN  0 ,
HEX

DECIMAL


: ZOOM.IN                       \ x y x y  -- zooms the world in to this rectangle
  0 0 LOCALS| RAT1 RAT2 ZY1 ZX1 ZY2 ZX2 |    \ define locals
  CURRENT.OBJECT @ >R              \ save current object
  WORLD.OBJECT SET.CURRENT.OBJECT        \ set world as current
  "UNDO.ZOOM SET.UNDOS
  MARK.CHANGE
  WINYMIN @ WINYMAX @ - ABS           \ current window y diff
  ZY1 ZY2 - ABS
  (FIX.UNSCALE) TO RAT1                \ rat1 = ( yrect.diff * scale ) ywindiff /
  WINXMIN @ WINXMAX @ - ABS           \ current window y diff
  ZX1 ZX2 - ABS
  (FIX.UNSCALE) TO RAT2                \ rat2 = ( xrect.diff * scale ) xwindiff /
  RAT1 RAT2 MIN
  SCALE.MAX MIN
  SCALE.MIN MAX TO RAT1                \ rat1 is relative scale
  ZY1 ZY2 -  2/ ZY2 +  TO  ZY1
  ZX1 ZX2 -  2/ ZX2 +  TO  ZX1         \ zx1, zxy are center of rect
  ZY1 YOFFSET @ -  NEG TO ZY1
  ZX1 XOFFSET @ -  NEG TO ZX1
  OBJECT.A3POS PLUCK               \ fetch current a pos
  ZX1 ZY1 0 INTEGER>FIX
  ADD.VECTORS >R 0
  RAT1 SCALE.VECTOR
  DROP R>
  OBJECT.A3POS PLACE               \ place in object
  OBJECT.SCALE PLUCK
  RAT1  (FIX.SCALE)
  SCALE.MAX MIN
  SCALE.MIN MAX
  OBJECT.SCALE PLACE
  GET.OBJECT
  SET.RELATIVE
  REDRAW.OBJECT
  OBJECT.CHANGED                   \ draw new scale
    DISPLAY.WORLD
  R> SET.CURRENT.OBJECT ;


: ZOOM.OUT                      \ x y x y  -- zooms the world in to this rectangle
  0 0 LOCALS| RAT1 RAT2 ZY1 ZX1 ZY2 ZX2     \ define locals
  CURRENT.OBJECT @ >R              \ save current object
  WORLD.OBJECT SET.CURRENT.OBJECT        \ set world as current
  "UNDO.ZOOM SET.UNDOS
  MARK.CHANGE
  ZY1 ZY2 - ABS
  WINYMIN @ WINYMAX @ - ABS           \ current window y diff
  (FIX.UNSCALE) TO RAT1                \ rat1 - ( yrect.diff * scale ) ywindiff /
  ZX1 ZX2 - ABS
  WINXMIN @ WINXMAX @ - ABS           \ current window x diff
  (FIX.UNSCALE) TO RAT2                \ rat2 - ( xrect.diff * scale ) xwindiff
```

-000963

```
RAT1 RAT2 MIN
SCALE.MAX MIN
SCALE.MIN MAX TO RAT1              \ rat1 is relative scale
5 MAX
ZY1 ZY2 -  2/ ZY2 +  TO  ZY1
ZX1 ZX2 -  2/ ZX2 +  TO  ZX1        \ zx1, zxy are center of rect
ZY1 YOFFSET @ -   TO  ZY1
ZX1 XOFFSET @ -   TO  ZX1
OBJECT.A3POS PLUCK                \ fetch current a pos
RAT1 SCALE.VECTOR
ZX1 ZY1 0 INTEGER>FIX
ADD.VECTORS
OBJECT.A3POS PLACE                \ place in object
OBJECT.SCALE PLUCK
RAT1 (FIX.SCALE)
SCALE.MAX MIN
SCALE.MIN MAX                    \ limit scale
OBJECT.SCALE PLACE
GET.OBJECT
SET.RELATIVE
REDRAW.OBJECT
OBJECT.CHANGED                   \ draw new scale
  DISPLAY.WORLD                    \ display
R> SET.CURRENT.OBJECT ;


: ZERO.RECT?
  LOCALS| THE.RECT |
  THE.RECT @ 0=
  THE.RECT 4+ @ 0 = AND ;


: SIZE.TO.FIT                    \ scales world to fit objects
  CURRENT.OBJECT @ >R
  WORLD.OBJECT SET.CURRENT.OBJECT
  SET.TREE.BOUNDS
  R> SET.CURRENT.OBJECT
  BOUNDS.RECT ZERO.RECT? NOT IF
    BOUNDS.RECT @RECT
    ZOOM.IN
  THEN ;



  5 CONSTANT ZOOM.TIMES

  HEX
  CREATE ZOOM.PAT   55AA55AA , 55AA55AA ,
  DECIMAL


 : SHOW.ZOOM            \ X1 Y1 X2 Y2 X3 Y3 X4 Y4  -- DOES ZOOM
  LOCALS| Y4 X4 Y3 X3 Y2 X2 Y1 X1
  X1 X2 MIN           \ sort for no flop
  X1 X2 MAX TO X2 TO X1
  Y1 Y2 MIN
  Y1 Y2 MAX TO Y2 TO Y1
  X3 X4 MIN           \ sort for no flop
  X3 X4 MAX TO X4 TO X3
  Y3 Y4 MIN
  Y3 Y4 MAX TO Y4 TO Y3
  10 PENMODE
  ZOOM.PAT PENPAT
  ZOOM.TIMES 0 DO
```

```
    X3 I *
    X1 ZOOM.TIMES I - * + ZOOM.TIMES /
    Y3 I *
    Y1 ZOOM.TIMES I - * + ZOOM.TIMES /
    X4 I *
    X2 ZOOM.TIMES I - * + ZOOM.TIMES /
    Y4 I *
    Y2 ZOOM.TIMES I - * + ZOOM.TIMES /
    4DUP
    FRAME RECTANGLE
     1 HOLDING
    FRAME RECTANGLE
  LOOP
  BLACK PENPAT ;


: ZOOM.IN.RECT
  @MOUSE POINT>XY
  0 0 LOCALS| NX NY LY LX
  10 PENMODE
  ZOOM.PAT PENPAT
  BEGIN
    DO.EVENTS DROP
    @MOUSE POINT>XY  TO NY TO NX
    LX LY NX NY FRAME RECTANGLE
    MOVE/UNCLICK
    1 HOLDING
    LX LY NX NY FRAME RECTANGLE
  MOUSE.BUTTON NOT UNTIL
  BLACK PENPAT
  LX NX - ABS 20 <
  LY NY - ABS 20 < OR IF
    LX NX + 2/ DUP TO LX TO NX
    LY NY + 2/ DUP TO LY TO NY
    GET.WINDOW   PRIGHTBOUNDS W@ EXT
    4/ DUP LX + TO LX
       NEG NX + TO NX
    GET.WINDOW  PDOWNBOUNDS W@ EXT
    4/ DUP LY + TO LY
       NEG NY + TO NY
  THEN
  LX V.TOOL.WIDTH - LY
  NX V.TOOL.WIDTH - NY
  V.TOOL.WIDTH 0
  GET.WINDOW   PRIGHTBOUNDS W@
  GET.WINDOW   PDOWNBOUNDS W@
  SHOW.ZOOM
  LX V.TOOL.WIDTH - LY
  NX V.TOOL.WIDTH - NY
  ZOOM.IN   ;


: ZOOM.OUT.RECT
  @MOUSE POINT>XY
  0 0 LOCALS| NX NY LY LX
  10 PENMODE
  ZOOM.PAT PENPAT
  BEGIN
    DO.EVENTS DROP
    @MOUSE POINT>XY  TO NY TO NX
    LX LY NX NY FRAME RECTANGLE
```

-000965

```
  MOVE/UNCLICK
  1 HOLDING
  LX LY NX NY FRAME RECTANGLE
MOUSE.BUTTON NOT UNTIL
BLACK PENPAT
LX NX - ABS 20 <
LY NY - ABS 20 < OR IF
  LX NX + 2/ DUP TO LX TO NX
  LY NY + 2/ DUP TO LY TO NY
  GET.WINDOW   PRIGHTBOUNDS W@ EXT
  4/ DUP LX + TO LX
     NEG NX + TO NX
  GET.WINDOW  PDOWNBOUNDS W@  EXT
  4/ DUP LY + TO LY
     NEG NY + TO NY
THEN
V.TOOL.WIDTH 0
GET.WINDOW   PRIGHTBOUNDS W@
GET.WINDOW   PDOWNBOUNDS W@
LX V.TOOL.WIDTH - LY
NX V.TOOL.WIDTH - NY
SHOW.ZOOM
LX V.TOOL.WIDTH - LY
NX V.TOOL.WIDTH - NY ZOOM.OUT   ;
```

I

JUN 7 1990

Body Electric 2.3b9.1

5/30/90

Source Listing

© 1990 VPL Research, Inc.

TOWNSEND and TOWNSEND
JARON LANIER, et al.
Atty Docket No. 10274-8
VIRTUAL REALITY NETWORK

000001

APPENDIX 2 done

| Name | Size | Kind | Last Modified | |
|---|---|---|---|---|
| Announce.ipas | 2K | THINK Pascal doc... | Fri, Jan 27, 1989 | 14:19 |
| AutoWindow.pas | 14K | THINK Pascal doc... | Fri, Aug 11, 1989 | 19:24 |
| bezier.pas | 6K | THINK Pascal doc... | Tue, Jul 18, 1989 | 16:28 |
| bezierDM.pas | 20K | THINK Pascal doc... | Tue, Apr 17, 1990 | 19:46 |
| bezier_types.pas | 2K | THINK Pascal doc... | Mon, Jul 17, 1989 | 18:06 |
| bezier_utils.pas | 2K | THINK Pascal doc... | Mon, Jul 17, 1989 | 17:18 |
| ChucksDAs.pas | 6K | THINK Pascal doc... | Thu, Apr 12, 1990 | 19:55 |
| ChuckStuff.pas | 17K | THINK Pascal doc... | Sun, Apr 22, 1990 | 12:54 |
| CompileTime directives | 3K | THINK Pascal doc... | Thu, Jan 25, 1990 | 12:25 |
| Convolvotron.pas | 14K | THINK Pascal doc... | Thu, Apr 26, 1990 | 21:56 |
| DAconfig.pas | 20K | THINK Pascal doc... | Mon, Mar 5, 1990 | 11:53 |
| DataAcquire.pas | 41K | THINK Pascal doc... | Thu, Mar 1, 1990 | 14:10 |
| DataFlashDA.pas | 12K | THINK Pascal doc... | Tue, Aug 15, 1989 | 14:01 |
| DataMassage.pas | 48K | THINK Pascal doc... | Thu, Apr 26, 1990 | 20:46 |
| DataSuit.pas | 17K | THINK Pascal doc... | Wed, Apr 25, 1990 | 6:06 |
| DG2BrightDM.pas | 11K | THINK Pascal doc... | Sun, Aug 20, 1989 | 1:55 |
| DMEdit.pas | 32K | THINK Pascal doc... | Thu, Apr 12, 1990 | 10:38 |
| DMFileIO.pas | 45K | THINK Pascal doc... | Thu, Jan 18, 1990 | 12:19 |
| DMGlobals.pas | 20K | THINK Pascal doc... | Thu, Apr 12, 1990 | 14:33 |
| DMTypes.pas | 8K | THINK Pascal doc... | Wed, Jan 10, 1990 | 16:21 |
| DSInitialize.pas | 9K | THINK Pascal doc... | Sun, Apr 22, 1990 | 12:54 |
| DynamicMenu.pas | 11K | THINK Pascal doc... | Fri, Jan 27, 1989 | 14:19 |
| EdDMList.pas | 9K | THINK Pascal doc... | Sun, Apr 15, 1990 | 11:21 |
| EditScript.pas | 14K | THINK Pascal doc... | Thu, Apr 12, 1990 | 10:26 |
| EtherGlue.pas | 8K | THINK Pascal doc... | Sun, Apr 22, 1990 | 13:03 |
| exScript.pas | 9K | THINK Pascal doc... | Wed, Apr 11, 1990 | 23:20 |
| FastStuff.a | 33K | MPW Shell document | Tue, Nov 28, 1989 | 1:58 |
| FastStuff.pas | 8K | THINK Pascal doc... | Sat, Sep 16, 1989 | 18:58 |
| FileIO.pas | 18K | THINK Pascal doc... | Fri, Apr 27, 1990 | 4:55 |
| FixedDMs.pas | 9K | THINK Pascal doc... | Sun, Apr 8, 1990 | 19:44 |
| Flex.pas | 51K | THINK Pascal doc... | Thu, Apr 26, 1990 | 21:06 |
| FlexDraw.pas | 21K | THINK Pascal doc... | Fri, Apr 20, 1990 | 20:31 |
| forExScript.pas | 12K | THINK Pascal doc... | Sun, Apr 8, 1990 | 19:44 |
| formTree.pas | 33K | THINK Pascal doc... | Sun, Apr 22, 1990 | 18:35 |
| GestDM.pas | 11K | THINK Pascal doc... | Sun, Apr 15, 1990 | 10:54 |
| Globals | 12K | THINK Pascal doc... | Sat, Mar 24, 1990 | 16:48 |
| glove_DA_module.pas | 5K | THINK Pascal doc... | Sun, Mar 4, 1990 | 2:59 |
| glove_Initialization.pas | 8K | THINK Pascal doc... | Wed, Mar 21, 1990 | 12:27 |
| glove_IOandDMs.pas | 11K | THINK Pascal doc... | Wed, Mar 21, 1990 | 12:27 |
| HandleDMs.pas | 20K | THINK Pascal doc... | Thu, Apr 12, 1990 | 13:25 |
| HostCom.pas | 24K | THINK Pascal doc... | Wed, Mar 21, 1990 | 12:27 |

done

| Name | Size | Kind | Last Modified |
|---|---|---|---|
| InitMac.pas | 5K | THINK Pascal doc... | Sun, Aug 20, 1989 23:38 |
| initMIDI.pas | 6K | THINK Pascal doc... | Mon, Apr 23, 1990 1:12 |
| iop1 | 12K | THINK Pascal doc... | Wed, Mar 21, 1990 10:46 |
| macADIOSda.pas | 6K | THINK Pascal doc... | Tue, Jan 2, 1990 14:11 |
| MIDI.p | 24K | THINK Pascal doc... | Wed, Dec 6, 1989 10:15 |
| midiDMs.pas | 9K | THINK Pascal doc... | Mon, Jan 8, 1990 23:55 |
| MiscRoutines.pas | 8K | THINK Pascal doc... | Mon, Apr 23, 1990 10:30 |
| new_adios.pas | 6K | THINK Pascal doc... | Thu, Dec 14, 1989 21:07 |
| PointDMs.pas | 33K | THINK Pascal doc... | Thu, Apr 26, 1990 20:46 |
| Polhm_DA_module.pas | 5K | THINK Pascal doc... | Tue, Dec 19, 1989 12:28 |
| Polhm_IO.pas | 14K | THINK Pascal doc... | Sun, Apr 15, 1990 10:15 |
| RobotDMs.pas | 14K | THINK Pascal doc... | Wed, Mar 21, 1990 10:46 |
| ScottsDMs.pas | 9K | THINK Pascal doc... | Thu, Apr 26, 1990 20:03 |
| scotts_stuff.pas | 3K | THINK Pascal doc... | Fri, Sep 8, 1989 15:21 |
| ScriptGlob.pas | 14K | THINK Pascal doc... | Tue, Jan 16, 1990 1:17 |
| ScriptList.pas | 6K | THINK Pascal doc... | Thu, Aug 17, 1989 17:58 |
| ScriptParse.pas | 11K | THINK Pascal doc... | Fri, Jan 27, 1989 14:21 |
| scripts.pas | 6K | THINK Pascal doc... | Wed, Apr 11, 1990 23:20 |
| Serial.pas | 9K | THINK Pascal doc... | Sun, Apr 15, 1990 10:15 |
| serialRoutines.pas | 15K | THINK Pascal doc... | Sat, Mar 24, 1990 16:48 |
| SerialTypes.pas | 3K | THINK Pascal doc... | Wed, Mar 21, 1990 12:27 |
| SGICom.pas | 53K | THINK Pascal doc... | Tue, Apr 24, 1990 20:56 |
| SGImisc.pas | 11K | THINK Pascal doc... | Tue, Jan 2, 1990 14:11 |
| ShowDM.pas | 2K | THINK Pascal doc... | Thu, Apr 12, 1990 14:37 |
| SimpleDMs.pas | 33K | THINK Pascal doc... | Fri, Dec 15, 1989 19:41 |
| SinCosTree.pas | 8K | THINK Pascal doc... | Mon, Apr 23, 1990 19:03 |
| SlotHandle.pas | 14K | THINK Pascal doc... | Mon, Mar 19, 1990 6:53 |
| smAutoLib.pas | 5K | THINK Pascal doc... | Fri, Aug 18, 1989 11:02 |
| SomeDMs.pas | 41K | THINK Pascal doc... | Sun, Apr 8, 1990 19:34 |
| Swivel_File_Format.pas | 15K | THINK Pascal doc... | Wed, Mar 21, 1990 10:46 |
| Swivel_Interface.pas | 20K | THINK Pascal doc... | Tue, Apr 24, 1990 20:56 |
| TimeDMs.pas | 15K | THINK Pascal doc... | Wed, Apr 25, 1990 6:06 |
| Tree3D.pas | 33K | THINK Pascal doc... | Thu, Apr 19, 1990 11:28 |
| Tree3DGlob.pas | 5K | THINK Pascal doc... | Fri, Apr 13, 1990 9:50 |
| TreeEdit.pas | 23K | THINK Pascal doc... | Thu, Apr 19, 1990 11:37 |
| TreeRender.pas | 9K | THINK Pascal doc... | Mon, Apr 23, 1990 10:57 |
| TrigDMs.pas | 11K | THINK Pascal doc... | Mon, Apr 23, 1990 10:30 |
| waveformDMs.pas | 9K | THINK Pascal doc... | Sun, Apr 15, 1990 13:00 |

```
;---------------------------------------------------------------
;
;       Miscelanous routines for DataSuit that have been coded
;       to be fast.
;
;       Copyright 1987 VPL Research, Inc.
;       7/28/87 Chuck Blanchard
;
; assemble in MPW with the following command line:
;       asm FastStuff.a -i {MPW}AIncludes:
;
;---------------------------------------------------------------


        PROC
        BLANKS  ON
        STRING  ASIS

 INCLUDE                'Traps.a'
 INCLUDE                'ToolEqu.a'
 INCLUDE                'QuickEqu.a'
 INCLUDE                'SysEqu.a'

; -----------------------------------------------------------------------
;       Macro Definitions
; -----------------------------------------------------------------------
; Push.l .w .b just does a move to the stack.

        MACRO
        push_l  &Long
                move.l  &Long,-(sp)
        ENDM
        MACRO
        push_w  &Word
                move.w  &Word,-(sp)
        ENDM
        MACRO
        push_b  &Byte
                move.b  &Byte,-(sp)
        ENDM

; Pull.l .w .b just does a move from the stack.
        MACRO
        pull_l  &Long
                move.l  (sp)+,&Long
        ENDM
        MACRO
        pull_w  &Word
                move.w  (sp)+,&Word
        ENDM
        MACRO
        pull_b  &Byte
                move.b  (sp)+,&Byte
        ENDM

; RSubPt subtracts a point in memory indexed off a given register
; from a point in a register.
; Ie: 'RSubPt  Point,a6,d0' is equal to:  'd0 := d0 - Point(a6)'
        MACRO
        RSubPt  &srcOfst,&sReg,&dstReg
                sub.w   &srcOfst+h(&sReg),&dstReg
                swap    &dstReg
```

```
                sub.w   &srcOfst+v(&sReg),&dstReg
                swap    &dstReg
        ENDM

; Insert the standard heading for a Pascal like Procedure.  Note: saveStk
; must already be set.
        MACRO
        ProcHead &ProcName,&LocalSize
&ProcName
                link    a6,#&LocalSize
                movem.l d0-d7/a0-a4,-(sp)
                move.l  sp,saveStk(a6)
        ENDM

; Pascal like Procedure end.  Insert text for symbolic debugger.  saveStk
; must already be defined. PROCNAME must be in capital letters.
        MACRO
        ProcEnd &PROCNAME,&Params
                move.l  saveStk(a6),sp
                movem.l (sp)+,d0-d7/a0-a4
                unlk    a6
                move.l  (sp),&params(sp)        ;Move rts addr up
                add     #&params,sp             ; and discard params.
                rts
                dc.b    '&PROCNAME[0,8]'
                ALIGN   2
                dc.w    0
        ENDM
; Code to fake TMON into recognizing labels for routines that don't
; use Link/unLink.
        MACRO
        AssHead
                link    a6,#0
        ENDM
        MACRO
        AssEnd  &NAME
                unlk    a6
                rts
                ProcName &NAME
        ENDM
; Just put the given procname past the rts.
        MACRO
        ProcName &NAME
                dc.b    '&NAME[1:8]'
                ALIGN   2
                dc.w    0
        ENDM

;----------------------------------------------------------------
; Interface procedures
;
; Procedure call(procAddr: pointer);
; Procedure callMassage(var DM: DMRec; procAddr: pointer);
; Function AHexWord(word: integer): string;
; procedure ZeroMem(start: Ptr; length: LongInt);
; SwapBytes(startAddr:Ptr; pairs: integer);

;----------------------------------------------------------------
; Procedure call(procAddr: pointer);
; jsr to the procedure at procAddr.
 EXPORT Acall
Acall
 EXPORT AcallMassage
```

```
AcallMassage
                move.l  (sp)+,d0        ;get return address.
                move.l  (sp)+,a0        ;get address to jsr to.
                move.l  d0,-(sp)        ;push back return address.
                jmp     (a0)            ;and goto procaddress.

; Function minOf(int1, int2: integer): integer;
; Return the min of two integers.
                AssHead
 EXPORT minOf
minOf
                move.l  (sp)+,a0                ;Get return
                move.w  (sp)+,d1                ;Get int2
                move.w  (sp)+,d0                ;Get int1
                cmp.w   d1,d0
                blt.s   @1
                move.w  d1,d0
@1
                move.w  d0,(sp)
                jmp     (a0)                    ;Return
                AssEnd  MINOF

; Function maxOf(int1, int2: integer): integer;
; Return the max of two integers.
                AssHead
 EXPORT maxOf
maxOf
                move.l  (sp)+,a0                ;Get return
                move.w  (sp)+,d1                ;Get int2
                move.w  (sp)+,d0                ;Get int1
                cmp.w   d1,d0
                bge.s   @1
                move.w  d1,d0
@1
                move.w  d0,(sp)
                jmp     (a0)                    ;Return
                AssEnd  MAXOF

; Function minmaxOf(int1, int2, int3: integer): integer;
; Return int2 forced into the range int1..int3.

                AssHead
  EXPORT minmaxOf
minmaxOf
                move.l  (sp)+, a0               ; pull return addr
                move.w  (sp)+, d0               ; pull high value
                move.w  (sp)+, d1               ; and int to force.
                cmp.w   d0, d1                  ; int > high?
                ble.s   @1                      ; no.
                move.w  d0, d1                  ; yes, use high.
@1              move.w  (sp)+, d0               ; pull low value
                cmp.w   d0, d1                  ; int < low?
                bge.s   @2                              ; no
                move.w  d0, d1                  ; yes, use low.
@2
                move.w  d1, (sp)                ; save value
                jmp     (a0)                    ; and return
                AssEnd  MINMAXOF

; Old code for minmaxof.  It has been optimized for more speed.
params          SET     6

fmmOf           SET     params+8
```

000006

T

```
intl            SET     params+8-2
int2            SET     intl-2
int3            SET     int2-2


saveStk         SET     -4
LocalSize       SET     saveStk

 EXPORT oldminmaxOf
                ProcHead oldminmaxOf,LocalSize

                move.w  intl(a6),dl
                move.w  int2(a6),d2
                move.w  int3(a6),d3
                cmp.w   d2,dl                   ;is intl < int2?
                ble.s   @1                      ; yes.
                move.w  dl,d2                   ; no, return intl.
                bra.s   @3
@1
                cmp.w   d2,d3                   ;is int3 > int2?
                bge.s   @3                      ; yes.
                move.w  d3,d2                   ; no, return int3.
@3
                move.w  d2,fmmOf(a6)

                ProcEnd OMINMAXO,params ;Saves procname for debugger

; FUNCTION AdegRange (i : integer) : integer;  { Return i in range 0..359 }
;
; BEGIN   { Force I into the range 0..359 }
;  WHILE i < 0 DO
;   i := i + 360;
;  While i > 360 do
;   i := i - 360;
; END;

                AssHead
 EXPORT AdegRange
AdegRange
                move.l  (sp)+,a0                ;Get Return addr.
                move.w  (sp)+,d0                ;Get i.

@0
                bpl.s   @1                      ;Greater than 0.
                add.w   #360,d0
                bra.s   @0
@1
                cmp.w   #360,d0                 ;less than 360?
                blt.s   @2                      ; yes.
                sub.w   #360,d0
                bra.s   @1
@2
                move.w  d0,(sp)                 ;save result.
                jmp     (a0)
                AssEnd  ADEGRANG

; Function AHexWord(word: integer): string;
; Return a 4 character string that is the hex string for this integer.

params          SET     2

fAHexWord       SET     params+8
lWord           SET     params+8-2
```

000007

```
saveStk         SET     -4
LocalSize       SET     saveStk

 EXPORT AHexWord
                ProcHead AHexWord,LocalSize

                move.l  fAHexWord(a6),a0
                move.w  lWord(a6),d0
                moveq   #3,d2           ; for d2 := 3 downto 0 do
@1
                move.w  d0,d1
                and.w   #$F,d1
                cmp.b   #$A,d1
                blt.s   @2
                add.b   #'A'-$A,d1
                bra.s   @3
@2
                add.b   #'0',d1
@3
                move.b  d1,1(a0,d2)
                lsr.w   #4,d0
                dbra    d2,@1

                moveq   #4,d0
                move.b  d0,(a0)

                ProcEnd AHEXWORD,params ;Saves procname for debugger


; procedure ZeroMem(start: Ptr; length: LongInt);
; zero out memory at the given address for length number of bytes.
params          SET     8

lstart          SET     params+8-4
llength         SET     lstart-4

saveStk         SET     -4
LocalSize       SET     saveStk

regNum          SET     12                      ;number of regs available.

 EXPORT ZeroMem
ZeroMem
                link    a6,#LocalSize
                movem.l d0-d7/a0-a5,-(sp)
                move.l  sp,saveStk(a6)

                lea     zeros,a0
                movem.l (a0),d1-d7/a1-a5
                move.l  lstart(a6),a0
                move.l  a0,d0
                add.l   #regNum*4+1,d0
                add.l   llength(a6),a0          ;a0 = last addr + 1.
@1
                cmp.l   d0,a0                   ;while a0 > start+regnum.
                ble.s   @0
                movem.l d1-d7/a1-a5,-(a0)       ;write regNum*4 zeros.
                bra.s   @1
@0
                move.l  lstart(a6),d0
@2
```

```
                cmp.l   a0,d0
                bge.s   @3
                move.b  d1,-(a0)
                bra.s   @2
@3
                move.l  saveStk(a6),sp
                movem.l (sp)+,d0-d7/a0-a5
                unlk    a6
                move.l  (sp),params(sp)         ;Move rts addr up
                add     #params,sp              ; and discard params.
                rts
                dc.b    'ZEROMEM '
                ALIGN   2
                dc.w    0
zeros           dc.l    0,0,0,0,0,0,0,0,0,0,0,0,0,0,0,0

; -------------
;
; SwapBytes(startAddr:Ptr; pairs: integer);
; Swap the high/low bytes in a sequence of words.  pairs is the number
; of byte pairs (words) to swap.
:

 EXPORT SwapBytes
SwapBytes
                move.l  (sp)+,a0                ;return addr
                move.w  (sp)+,d0                ;count
                sub.w   #1,d0
                move.l  (sp)+,a1                ;start addr.
; loop doing one at a time.
@1
                move.w  (a1),d1
                rol.w   #8,d1
                move.w  d1,(a1)+
                dbra    d0,@1
;
                jmp     (a0)                    ;return


;  procedure UnionPoints (var r: Rect; p1, p2: Point);

params          SET     12

r               SET     params+8-4
p1              SET     r-4
p2              SET     p1-4

saveStk         SET     -4
LocalSize       SET     saveStk

 EXPORT UnionPoints
UnionPoints
                link    a6,#LocalSize
                movem.l d2/a2,-(sp)


; Get the Rectangle and points addresses
                movea   r(a6),a0
                lea             p1(a6),a1
                lea             p2(a6),a2
; sort the points horizontal components
                move.w  h(a1), d1
```

000009

```
                move.w  h(a2), d2
                cmp.w   d1,d2
                bge.s   @1
                move.w  d2,d0                   ; swap min and max horz.
                move.w  d1,d2
                move.w  d2,d1
@1
                cmp.w   left(a0),d1
                bge.s   @2
                move.w  d1,left(a0)
@2
                cmp.w   right(a0),d2
                ble.s   @3
                move.w  d2,right(a0)
@3
; Now sort the vertical components
                move.w  v(a1), d1
                move.w  v(a2), d2
                cmp.w   d1,d2
                bge.s   @4
                move.w  d2,d0                   ; swam min and max vert.
                move.w  d1,d2
                move.w  d2,d1
@4
                cmp.w   top(a0),d1
                bge.s   @5
                move.w  d1,top(a0)
@5
                cmp.w   bottom(a0),d2
                ble.s   @6
                move.w  d2,bottom(a0)
@6

                movem.l (sp)+,d2/a2
                unlk    a6
                move.l  (sp),params(sp)         ;Move rts addr up
                add     #params,sp              ; and discard params.
                rts
                dc.b    'UNIONPOI'
                ALIGN   2

; -------------
; Fast Scale/Offset DM code to be called by Writable DM code.
; d0.w = input value, d1.l = scale, d2.w = offset.
; d0 = d0 * d1 + d2.
 EXPORT FastScale
FastScale
                move.w          d2,-(sp)        ; hang onto offset
                subq            #4,sp           ; space for function result.
                move.l          d1, -(sp)       ; push scale
                swap            d0              ; make fixed out of integer
                move.w          #0,d0           ;  input
                move.l          d0,-(sp)        ; push input
                _FixMul                         ; multiply input * scale
                move.l          (sp)+,d0
                add.l           #$8000,d0       ; round result
                swap            d0              ; turn back into an integer
                add.w           (sp)+,d0        ; pull and add offset
                rts

; This routine gets executed when an ansync read completes.  Save the
; bytes just read in in a global buffer, set a flag, and issue a new read.
; When the routine is entered.
```

```
;       rFlag: integer;
;       readCount: LongInt;
;       GlobalBuffer: Ptr;
; A0 -> readBlock: ParamBlock

rFlag           SET     -10
readCount       SET     -8
GlobBuff        SET     -4

        AssHead
 EXPORT ReadCompletion
ReadCompletion
        movem.l a4,-(sp)
        move.l  a0,a4

; Move the bytes just read into the global buffer.
; BlockMove(src{A0}, dest{A1}, size{D0});
        move.l  ioBuffer(a4), a0
        move.l  GlobBuff(a4), a1
        move.l  readCount(a4), d0
        _BlockMove

; Set the rFlag to say a new buff has been read.
        moveq   #-1, d0
        move.w  d0, rFlag(a4)

; Issue a new Async Read for the next set of bytes.
        move.l  a4,a0
        move.l  readCount(a4),ioByteCount(a0)
        _Read   ,ASYNC

; Restore A4 and exit.
        move.l  (sp)+, a4
        rts
        AssEnd  READCOMP

; cbLine.a
; -------------------------------------------------------------
;
;       Chuck Blanchard 7/26/86
;       68000 routines hand coded to run faster.
;       Chuck Blanchard 11/14/87 - Took line drawing routines out of
;               Hand3d.asm to make this.
;
; Routines:
;       cbLine(h,v: intger);
;       cbLineTo(h,h: integer);
;
; These two work just like quickdraw's }
; line and lineto.  They use the current grafports (thePort), penloc, penSize (up
; 16x16), and penMode (patCopy, patXor, patOr, patBic), coordinate system }
; (LocaltoGlobal) and bitmap.  Don't use visRgn, clipRgn, penPat (always black), }
; picSave, rgnSave or polySave. }
; 11/17/87 - Added clipping to the current ClipRgns ClipRect.
;
; -------------------------------------------------------------


 EXPORT cbLine, cbLineTo

;       INCLUDE         'Traps.a'
;       INCLUDE         'ToolEqu.a'
;       INCLUDE         'QuickEqu.a'
```

000011

```
;       INCLUDE         'SysEqu.a'
;       INCLUDE         'FixMath.a'
;       INCLUDE         'Root:Tools:ChuckLib:CLib.Macros.a'

;----------------------------------------------------------------
; Line(pt: point); Draw a relative line.  Fix pt and call Lineto
cbLine
                movem.l d0/a0,-(sp)
                move.l  $C(sp),d0               ;get relative to pt.
                move.l  thePort(a5),a0          ;get thePortptr
                move.l  (a0),a0
                add.w   pnLoc+h(a0),d0          ;add horizontal
                swap    d0
                add.w   pnLoc+v(a0),d0          ;add vertical
                swap    d0
                move.l  d0,$C(sp)               ;fixup point.
                movem.l (sp)+,d0/a0             ;restore registers.
; fall into cbLineto

;----------------------------------------------------------------
; cbLineto(pt: point);  Same as macro _LineTo except it doesn't check for
; visRgn stuff, ignore's pattern...
; Ver 0.3,10/14/85 - Horzizontal pensize works 1 to 15.
; Ver 0.4,10/14/85 - Vertical pensize works to real big.
; Ver 0.5,10/16/85 - Got rid of bitor table, use bits to or as loop counter.
;                    Vertical line loop only draw's a pen when apropriate.
; Ver 0.6,11/11/85 - Fixed code to get proper thePort^ instead of -4(a5)
;          7/31/86 - Changed penMode to patBic.
; Register usage: << out of date >>
; a2    = thePort;
; d0    =
; d1    =
; d2    =
; d3    = endpoint codes.  p1code is in d3.w, p2code in high word.
; d4    = VoverH
; d5    = HoverV
; d6    = p1    { y in high order word.}
; d7    = p2    { ditto }
params          SET     4
Ppt             SET     params+8-4

LportRect       SET     -8                      ;rect to clip to.
Lequal          SET     LportRect-2
LocalSize       SET     Lequal
hBit            EQU     0
vBit            EQU     1

cbLineTo
                link    a6,#LocalSize
                movem.l d0-d7/a0-a4,-(sp)

                move.l  Ppt(a6),d7              ;set to point.
                move.l  thePort(a5),a2          ;Get theport ptr.
                move.l  (a2),a2                 ; and theport addr.
                move.l  pnLoc(a2),d6            ;set from pt.
                move.l  Ppt(a6),pnLoc(a2)       ;update thePort.
        ; LportRect := thePort^.portRect;
                move.l  portRect(a2),LportRect(a6) ; set local portrect
                move.l  portRect+4(a2),LportRect+4(a6)
        ; SectRect(LPortRect,thePort^.clipRgn^^.rgnBBox, LPortRect): Boolean;
                subq    #2,sp                   ;for boolean
                pea     LportRect(a6)
                move.l  clipRgn(a2),a0          ;get clip handle
```

```
                move.l  (a0),a0                 ;change to pointer.
                pea     rgnBBox(a0)             ;push clip rgn rect addr.
                pea     LPortRect(a6)           ; dest rect will be local rect
                _SectRect
                btst.b  #0,(sp)+                ;rectangles intersect?
                beq     NoDraw                  ; no, don't draw nothing.
                move.w  pnSize+h(a2),d0
                sub.w   d0,LportRect+right(a6)  ; right = right - pnSize.h
                move.w  pnSize+v(a2),d0
                sub.w   d0,LportRect+bottom(a6)
; Check the end point codes for these points as is.
                move.l  d6,d0
                bsr     EndPoint
                swap    d3
                move.l  d7,d0
                bsr     EndPoint
        ; if p1code = 0 and p2code 0 = then dLine
                tst.l   d3
                beq     DLine                   ;Draw the line as is.
        ; if p1code and p2code <> 0 then line is invisible.
                move.l  d3,d0
                swap    d0
                and.w   d3,d0                   ;Is and <> 0?
                bne     NoDraw                  ; yes, don't draw nothing.
; Set bits to say whether horz is equal and whether vert is equal.
; If they aren't equal, then set HoverV and VoverH.
                move.w  d7,d0
                sub.w   d6,d0                   ;d0 := p2.h - p1.h;
                swap    d6
                swap    d7
                move.w  d7,d1
                sub.w   d6,d1                   ;d1 := p2.v - p1.v;
                swap    d6
                swap    d7
                clr.w   Lequal(a6)
                tst.w   d0                      ;Is horz equal?
                bne.s   @1                      ; no.
                bset    #hBit,Lequal(a6)        ;Yes, set bit.
                bra.s   @3
@1              tst.w   d1                      ;Is vert zero?
                bne.s   @5                      ; no
                clr.l   d4                      ;yes, 0/? = 0.
                bra.s   @3
@5              movem.w d0/d1,-(sp)
                subq    #4,sp                   ;for func result
                push_w  d1                      ;push vert
                push_w  d0                      ;push horz
                _FixRatio
                pull_l  d4                      ;pull to VoverH
                movem.w (sp)+,d0/d1
@3
                tst.w   d1                      ;Is vert equal?
                bne.s   @2                      ; no.
                bset    #vBit,Lequal(a6)
                bra.s   @4
@2              tst.w   d0                      ;Is horz zero?
                bne.s   @6                      ; no
                clr.l   d5                      ;yes, 0/? = 0.
                bra.s   @4
@6              movem.w d0/d1,-(sp)
                subq    #4,sp                   ;for func result
                push_w  d0                      ;push horz
                push_w  d1                      ;push vert
```

```
                _FixRatio
                pull_l  d5                          ;pull to HoverV
                movem.w (sp)+,d0/d1
@4
CheckHorz
        ; if p1.h > p2.h then swap(p1,p2,p1code,p2code)
                cmp.w   d7,d6                       ;is p1.h > p2.h?
                ble.s   @0                          ; no.
                exg     d6,d7
                swap    d3
@0      ; if bitand(p1code,1) <> 0 then HorzClip(p1,window.left);
                btst    #16+0,d3
                beq.s   @1
                move.l  d6,d0
                move.w  LportRect+left(a6),d1
                bsr     HorzClip
                move.l  d0,d6
@1      ; if bitand(p2code,2) <> 0 then HorzClip(p2,window.right);
                btst    #1,d3
                beq.s   @2
                move.l  d7,d0
                move.w  LportRect+right(a6),d1
                bsr     HorzClip
                move.l  d0,d7
@2
; ReCheck the end point codes for these points after horz clipped.
                move.l  d6,d0
                bsr     EndPoint
                swap    d3
                move.l  d7,d0
                bsr     EndPoint
        ; if p1code = 0 and p2code 0 = then dLine
                tst.l   d3
                beq.s   DLine                       ;Draw the line as is.
        ; if p1code and p2code <> 0 then line is invisible.
                move.l  d3,d0
                swap    d0
                and.w   d3,d0                       ;Is and <> 0?
                bne     NoDraw                      ; yes, don't draw nothing.
CheckVert
        ; if p1.v > p2.v then swap(p1,p2,p1code,p2code)
                swap    d6
                swap    d7
                cmp.w   d7,d6                       ;is p1.v > p2.v?
                ble.s   @0                          ; no.
                exg     d6,d7
                swap    d3
@0              swap    d6                          ;Restore v to top word.
                swap    d7
        ; if bitand(p1code,8) <> 0 then VertClip(p1,window.top);
                btst    #16+3,d3
                beq.s   @1
                move.l  d6,d0
                move.w  LportRect+top(a6),d1
                bsr     VertClip
                move.l  d0,d6
@1      ; if bitand(p2code,4) <> 0 then VertClip(p2,window.bottom);
                btst    #2,d3
                beq.s   @2
                move.l  d7,d0
                move.w  LportRect+bottom(a6),d1
                bsr     VertClip
                move.l  d0,d7
```

```
@2
; Draw the line in d6 and d7.
; move d6 to d4/d5, d7 to d6/d7
DLine
                move.w  d6,d4
                swap    d6
                move.w  d6,d5
                move.w  d7,d6
                swap    d7
        ; change local coordinates to global coordinates.
        ; LocaltoGlobal(d4/d5)
                sub.w   portBits+bounds+left(a2),d4
                sub.w   portBits+bounds+top(a2),d5
        ; LocaltoGlobal(d6/d7)
                sub.w   portBits+bounds+left(a2),d6
                sub.w   portBits+bounds+top(a2),d7
        ; Finally, draw the line.
; Draw a line. d4/d5.w is one point, d6/d7.w is another.
; d4&d6 are horizontal, d5&d7 are vertical.
; A2 has addr of thePort.
                CMP.W   D6,D4                   ;Is horz d4 < horz d6?
                BLS.S   DLineLT                 ; yes...
                EXG     D4,D6                   ;No, flip line pairs.
                EXG     D5,D7
DLineLT         MOVE.W  D6,D2                   ;d2 = horizontal
                SUB.W   D4,D2                   ; separation.
                MOVE.W  D7,D3                   ;d3 = vertical
                SUB.W   D5,D3                   ; separation.
                MOVE.W  portBits+rowbytes(a2),D6 ;d6 = rowbytes.
                move.w  d6,a3                   ;positive scanline sep.
                move.w  d6,d1                   ; and here for a sec.
                CMP.W   D7,D5                   ;line going up diagnally?
                BLS.S   @1                      ; no.
                NEG.W   D6                      ;Yes, negate rowbytes
                NEG.W   D3                      ; and vertical separation.
@1
; Calculate real start address.
                MOVE.L  portBits+baseAddr(a2),A0
                muls.W  d1,D5                   ;Vert start = vs * rowbytes
                ADD.W   D5,A0
                MOVE.W  D4,D0
                LSR.W   #3,D0                   ;horz start = hs / 8
                AND.W   #$FFFE,D0               ; but make sure it is even.
                ADD.W   D0,A0                   ;  add to start addr.
                move.w  #$F,d0                  ;D4 = start addr
                AND.W   d0,D4                   ;       mod 16 (bit addr)
                sub.w   d4,d0                   ;d0 = inv(d4) (15-0,0-15)
; d1 = # of bits, d0 = left bit position.
; make d4 = longword to or to screen.
                lea     OrBits,a1
                move.w  PnSize+h(a2),d1         ;Get current pen size.
                cmp     -2(a1),d1               ;Still same?
                beq.s   @2                      ; yes,
                move.w  d1,-2(a1)               ;No, set the same.
                moveq   #1,d4                   ;D4= right justified
                lsl.l   d1,d4                   ;  pnSize bits.
                subq.l  #1,d4                   ;  ie: 5 = 00011111
                move.w  #17,d5                  ;Now left shift these bits
                sub.w   d1,d5                   ; up to 1st bit if high
                lsl.l   d5,d4
                move.l  d4,(a1)
@2              move.l  (a1),d4                 ;Get orBits
                lsl.l   d0,d4                   ;Shift to right start.
```

```
; Do Self modifying code based on the penMode.
; patCopy and patOr, nop for not, or.l for screen writes.
; patXor            nop for not, Eor.l for screen writes.
; patBic            not.l for not, and.l for screen writes.
; everything else like patOr.
; Use D0, D1, D7, A1
 EXPORT SelfMod, InstNotl
 EXPORT Not1, Not2, Not3, Not4
 EXPORT HitS1, HitS2, HitS3, HitS4, HitS5
SelfMod
                move.w  pnMode(a2),d7           ;get penmode
                cmp.w   cPenMode,d7             ; same as last time?
                beq.s   SelfModx                ; yes, don't change.
                lea     cPenMode,a1
                move.w  d7,(a1)
                cmp.w   #patBic,d7              ;penmode patBic?
                bne.s   @1
                move.w  InstNotl,d0             ;Yes, set not.l
                move.w  InstAndl,d1             ; and and.l
                bra.s   @2
@1
                move.w  InstNop,d0              ;do nop, not not.l
                cmp.w   #patXor,d7              ;penmode patXor?
                bne.s   @3
                move.w  InstEorl,d1             ;Yes, set Eor.l
                bra.s   @2
@3              move.w  InstOrl,d1              ;No, set or.l
; D0 has inst for nots, D1 has inst for screen modify.
; modify the code.
@2
                lea     Not1,a1
                move.w  d0,(a1)
                lea     Not2,a1
                move.w  d0,(a1)
                lea     Not3,a1
                move.w  d0,(a1)
                lea     Not4,a1
                move.w  d0,(a1)
                lea     HitS2,a1
                move.w  d1,(a1)
                lea     HitS3,a1
                move.w  d1,(a1)
                lea     HitS4,a1
                move.w  d1,(a1)
                lea     HitS5,a1
                move.w  d1,(a1)
                lea     HitS1,a1
                and.w   #$FFF8,d1               ;chng reg from a4 to a0.
                move.w  d1,(a1)
 SelfModx
                cmp.w   #patBic,pnMode(a2)      ;and mode?
                bne.s   @1                      ; no.
                not.l   d4                      ;Yes, invert the bits.
 @1

 ; Set d5 to loopCount for vertical pensize.
                move.w  pnSize+v(a2),d5         ;Set vert pensize.
                subq.w  #1,d5                   ; -1.

 ; Finally, do the actual line draw.
 ; d0 will be temp vert pnsize looper
 ; d1 = loop counter.
```

```
; d2 = horizontal separation
; d3 = vertical separation
; d4 = Bits to or.
; d5 = Vertical pnsize.
; d6 = vertical scan line increment.
; d7 will be number of scanlines to draw onto.

; a0 = start addr
; a1 =
; a3.w = positive vert scanline increment.
; a4 will be temp start addr.

                CMP.W   D3,D2                   ;Is horz sep > vert sep?
                BHI.S   BigHorz                 ; yes.
; Vert sep > horz sep.
BigVert
                MOVE.W  D3,D1
                MOVE.W  D3,D7
                bsr.s   DrawVHang
BigVLp
HitS1           or.l    d4,(a0)
                SUB.W   D2,D1                   ;Time to move horizontal?
                BLS.S   BigV4                   ; yes.
BigV3           ADD.W   D6,A0
BigV7           DBRA    D7,BigVLp
        ; Exit, draw last hang.
                sub.w   d6,a0
                bsr.s   DrawVHang
                bra.s   NoDraw
BigV4
                tst.w   d6                      ;Is vert going down?
                bmi.s   BigV6                   ; no...
        ; draw vert hang.
                move.w  d5,d0                   ;Draw for height of pen
                move.l  a0,a4
BigV1
HitS2           OR.l    d4,(A4)
                add.w   a3,a4
                dbra    d0,BigV1
BigV6           ADD.W   D3,D1
Not1            nop
                lsr.l   #1,d4                   ;Shift bits down 1
                cmp.l   #$0000FFFF,d4           ; has high word gone zero?
                bgt.s   BigV5                   ;Not yet.
                swap    d4                      ;Yes, flip low/high.
                ADDQ.L  #2,A0
BigV5
Not2            nop
                tst.w   d6                      ;Is vert going up?
                bpl.s   BigV3                   ; no, continue.
                add.w   d6,a0
        ; Draw vertical hang.
                move.w  d5,d0                   ;Draw for height of pen
                move.l  a0,a4
BigV2
HitS3           OR.l    d4,(A4)
                add.w   a3,a4
                dbra    d0,BigV2
                BRA.S   BigV7
; for lines that don't change that much horizontally, draw the vertical
; part of the pen only when horz does change.
DrawVHang
                move.w  d5,d0                   ;Draw for height of pen
```

```
                move.l  a0,a4
DrV1
HitS4           OR.l    d4,(A4)
                add.w   a3,a4
                dbra    d0,DrV1
                rts

; Horz sep > vert sep.
BigHorz
                MOVE.W  D2,D1
                MOVE.W  D2,D7
BigHLp
                move.w  d5,d0                   ;Draw for height of pen
                move.l  a0,a4
BigH1
HitS5           OR.l    d4,(A4)
                add.w   a3,a4
                dbra    d0,BigH1
                SUB.W   D3,D1                   ;Change to new scanline?
                BLS.S   BigH4                   ; yes.
BigH3
Not3            nop
                lsr.l   #1,d4                   ;Shift bits down 1
                cmp.l   #$0000FFFF,d4           ; has high word gone zero?
                bgt.s   BigH8                   ;Not yet.
                swap    d4                      ;Yes, flip low/high.
                ADDQ.L  #2,A0                   ; Inc to next addr.
BigH8
Not4            nop
                DBRA    D7,BigHLp
                bra.s   NoDraw
        ; Time to move to a new scanline.
BigH4           ADD.W   D2,D1
                ADD.W   D6,A0                   ;update scanline addr.
                BRA.S   BigH3

; Done drawing or don't draw at all, return to calling routine.
NoDraw
                movem.l (sp)+,d0-d7/a0-a4
                unlk    a6
                move.l  (sp),params(sp)         ;Move rts addr up
                add     #params,sp              ; and discard params.
                rts


; OrBits will be reset every time the horzizontal pensize changes.
; OrBits = Horz bits left justified.
; Ie: pnSize.h = 7, OrBits.l = 0000 0001  FC00 0000  (seven bits)
PenHorz         dc.w    0       ;Current horz pen setup.
OrBits          dc.l    0       ;Horz bits left justified to 1.
cPenMode        dc.w    -43     ;Current pen Mode.
; Instructions for self modifying code.
InstNotl        not.l   d4
InstNop         nop
InstOrl         or.l    d4,(A4)
InstAndl        and.l   d4,(a4)
InstEorl        Eor.l   d4,(a4)

; ---------------------------- Three subroutines --------------------------
; HorzClip(pt: point[d0.l]; edge: integer[d1.w]);
HorzClip
                move.w  d1,-(sp)                ; save edge;
                btst    #vBit,Lequal(a6)        ; is vertical equal?
```

```
            bne.s   @1                        ; yes, all done.
    ; pt.v := round(VoverH * (edge - pt.h)) + pt.v;
            sub.w   d0,d1                     ; edge := edge - pt.h;
            swap    d1                        ;turn d1 into
            clr.w   d1                        ; a fixed.
            push_l  d0                        ;hang onto pt.
    ; fixMul(a,b: fixed): fixed;
            subq    #4,sp                     ;for func result.
            push_l  d4                        ;push VoverH
            push_l  d1                        ;push edge - pt.h
            _FixMul                           ;Multiply them.
            move.l  (sp)+,d0                  ;pull result
            smi     -(sp)                     ;push negative flag.
            bpl.s   @2
            neg.l   d0                        ;If neg then flip to pos.
@2  ; fixRound(x: fixed): integer;
            subq    #2,sp                     ;for func result
            push_l  d0
            _FixRound
            move.w  (sp)+,d1                  ;Pull rounded result
            tst.b   (sp)+                     ;test neg flag.
            beq.s   @3                        ;wasn't neg.
            neg.w   d1                        ; was neg, flip back.
@3          move.l  (sp)+,d0                  ;pull pt back.
            swap    d0                        ;move .v to lower word.
            add.w   d1,d0                     ; pt.v := pt.v + round;
            swap    d0
@1
            move.w  (sp)+,d0                  ;pt.h := edge;
            rts

; VertClip(pt: point[d0.l]; edge: integer[d1.w]);
VertClip
            move.w  d1,-(sp)                  ; hang onto edge.
            swap    d0                        ;Flip horz & vert component.
            btst    #hBit,Lequal(a6)          ; is horizontal equal?
            bne.s   @1                        ; yes, all done.
    ; pt.v := round(HoverV * (edge - pt.v)) + pt.h;
            sub.w   d0,d1                     ; edge := edge - pt.v;
            swap    d1                        ;turn d1 into
            clr.w   d1                        ; a fixed.
            push_l  d0                        ;hang onto pt.
    ; fixMul(a,b: fixed): fixed;
            subq    #4,sp                     ;for func result.
            push_l  d5                        ;push HoverV
            push_l  d1                        ;push edge - pt.v
            _FixMul                           ;Multiply them.
            move.l  (sp)+,d0                  ;pull result
            smi     -(sp)                     ;push negative flag.
            bpl.s   @2
            neg.l   d0                        ;If neg then flip to pos.
@2  ; fixRound(x: fixed): integer;
            subq    #2,sp                     ;for func result
            push_l  d0
            _FixRound
            move.w  (sp)+,d1                  ;Pull rounded result
            tst.b   (sp)+                     ;test neg flag.
            beq.s   @3                        ;wasn't neg.
            neg.w   d1                        ; was neg, flip back.
@3          move.l  (sp)+,d0                  ;pull pt back.
            swap    d0                        ;move .h to lower word.
            add.w   d1,d0                     ; pt.h := pt.h + round;
            swap    d0
```

```
@1              move.w  (sp)+,d0                ; pt.v := edge;
                swap    d0
                rts

; EndPoint(p:point[d0]; pcode:integer[d3.w]; grafport:ptr[a2]);
; Set the endpoint code based on the point and Lportrect.
EndPoint
                clr.w   d3
                move.l  d0,d1
                swap    d1
                lea     LportRect(a6),a0
                cmp.w   (a0)+,d1                ;If y1 < w.T
                bge.s   @4
                bset    #3,d3                   ; then bitor(Pcode,8);
@4
                cmp.w   (a0)+,d0                ;If p.h < w.L
                bge.s   @1
                bset    #0,d3                   ; then bitor(Pcode,1);
@1
                cmp.w   (a0)+,d1                ;If y1 >= w.B
                blt.s   @3
                bset    #2,d3                   ; then bitor(Pcode,4);
@3
                cmp.w   (a0)+,d0                ;If p.h >= w.R
                blt.s   @2
                bset    #1,d3                   ; then bitor(Pcode,2);
@2
                rts

;----------------------------------------------------------------
;
;       Fast point rotate
;
;       Copyright 1987 VPL Research, Inc.
;       1/19/89 Chuck Blanchard
;
;----------------------------------------------------------------

 IMPORT bSinPtr:DATA

;;
;;  REGISTER BASED
;;  procedure BigRot (var a, b : Integer;
;;          theta : integer);
; All paramters are passed by register.
; A3 = ptr to a, A4 = ptr to b, D7 = angle. A5 = global ptr.
; Uses A0/D0-D7
BigRot
                move.w  (a3),d5                 ; D5 = old a
                move.w  (a4),d6                 ; D6 = old b
                moveq   #0,d2                   ; negative flags.
                move.w  d7,d0
                sub.w   #900,d0                 ; in range 0 <= ang < 900
                bpl.s   quad1
                                                    ; 0: { 0 <= theta < 900 }
quad0
                move.w  d7,d3                   ;           sinIdx := theta;
                bclr    #0,d2                   ;           sinSign := 1;
                move.w  #899,d4                 ;           cosIdx := 899 - th
                sub.w   d7,d4
                bclr    #1,d2                   ;           cosSign := 1;
                bra.s   quadend                 ;       end;
                                                    ; 1:        { 900 <= t
quad1
                sub.w   #900,d0                 ; next quad.
```

```
               bpl.s    quad2
               move.w   #1799,d3              ;              sinIdx := 1799 - t
               sub.w    d7,d3
               bclr     #0,d2                 ;              sinSign := 1;
               move.w   d7,d4                 ;              cosIdx := theta -
               sub.w    #900,d4
               bset     #1,d2                 ;              cosSign := -1;
               bra.s    quadend               ;        end;
quad2                                                 ; 2:          { 1800 <=
               sub.w    #900,d0               ; next quad.
               bpl.s    quad3
               move.w   d7,d3                 ;              sinIdx := theta -
               sub.w    #1800,d3
               bset     #0,d2                 ;              sinSign := -1;
               move.w   #2699,d4              ;              cosIdx := 2699 - t
               sub.w    d7,d4
               bset     #1,d2                 ;              cosSign := -1;
               bra.s    quadend               ;        end;
quad3                                                  ;3:          { 2700 <=
               move.w   #3599,d3              ;              sinIdx := 3599 - t
               sub.w    d7,d3
               bset     #0,d2                 ;              sinSign := -1;
               move.w   d7,d4                 ;              cosIdx := theta -
               sub.w    #2700,d4
               bclr     #1,d2                 ;              cosSign := 1;
                                              ; end;
quadend
               add.w    d3,d3                 ; turn byte index into int index
               add.w    d4,d4                 ; turn byte index into int index
               move.l   bsinPtr(a5),a0  ; get big sin table pointer.
               move.w   (a0,d3.w),d3    ; get sin for theta
               btst     #0,d2
               bz.s     sinpos
               neg.w    d3                               ; negate sine
sinpos
               move.w   (a0,d4.w),d4    ; cos for theta
               btst     #1,d2
               bz.s     cospos                ; negate cos
               neg.w    d4
cospos

;;   a := (a1 * cosTable[theta] - b * sinTable[theta]) div 1024;
               move.w   d5,d1                 ;d1 := a
               muls     d4,d1                 ; * cos(theta)
               move.w   d6,d0                 ;d0 := b
               muls     d3,d0                 ; * sin(theta)
               sub.l    d0,d1                 ;d1 := d1 - d0;
               moveq    #10,d0
               lsr.l    d0,d1                 ; d1 := d1 / 1024
;              divs     #1000,d1              ;d1 := d1 / 1000
               move.w   d1,(a3)               ;save new A.
;;   b := (a1 * sinTable[theta] + b * cosTable[theta]) div 1024;
               move.w   d5,d1                 ;d1 := a
               muls     d3,d1                 ; * sin(theta)
               move.w   d6,d0                 ;d0 := b
               muls     d4,d0                 ; * cos(theta)
               add.l    d0,d1                 ;d1 := d1 + d0;
               moveq    #10,d0
               lsr.l    d0,d1                 ; d1 := d1 / 1024
;              divs     #1000,d1              ;d1 := d1 / 1000
               move.w   d1,(a4)               ;save new B.
;;   end;
               rts
```

T

```
                dc.b    'BIGROT  '
                ALIGN   2
                dc.w    0

; procedure BigRotate (var pt : Point3d; t : transTrip);
;
;;  procedure BigRotate (var pt : Point3d;
;;          t : transTrip);
;;   { Rotate this point by the given translation triplicate. }
;;  begin
 EXPORT BigRotate
BigRotate

        link            A6,#-6
        movem.l         a0-a4/d0-D7,-(SP)
        movea.l         8(A6),a2
        move.l          (a2),-6(A6)
        move.w          4(a2),-2(A6)
;;   with pt, t do
        movea.l         12(A6),a2
;;    begin
;;     if roll <> 0 then
        tst.w           -2(A6)          ;roll = 0?
        beq.s           sl3il1          ; yes.
;;      BigRot(x, y, roll);
        move.l          a2,a3           ;set ptr to x
        lea             2(a2),a4        ;set ptr to y
        move.w          -2(A6),d7       ;set ang to roll
        jsr.w           BigRot
sl3il1
;;     if pitch <> 0 then
        tst.w           -4(A6)
        beq.s           sl3il2
;;      BigRot(y, z, pitch);
        lea             2(a2),a3        ;set ptr to y
        lea             4(a2),a4        ;set ptr to z
        move.w          -4(A6),d7       ;set ang to pitch
        jsr.w           BigRot
sl3il2
;;     if yaw <> 0 then
        tst.w           -6(A6)
        beq.s           sl3il3
;;      BigRot(x, z, yaw);
        move.l          a2,a3           ;set ptr to x
        lea             4(a2),a4        ;set ptr to z
        move.w          -6(A6),d7       ;set ang to yaw.
        jsr.w           BigRot
sl3il3
;;    end;
;;  end; { Rotate }
        movem.l         (SP)+,a0-a4/d0-D7
        unlk            A6
        movea.l         (SP)+,A0
        addq.l          #8,SP
        jmp             (A0)
        dc.b    'BIGROTAT'
        ALIGN   2
        dc.w    0

; procedure BigUnrotate (var pt : Point3d; t : transTrip);
;
;;  procedure BigUnrotate (var pt : Point3d;
;;          t : transTrip);
```

T

```
;;   { Unrotate this point by the given translation triplicate. }
;;  begin
        EXPORT BigUnrotate
BigUnrotate

        link            A6,#-6
        movem.l         a0-a4/d0-D7,-(SP)
        movea.l         8(A6),a2
        move.l          (a2),-6(A6)
        move.w          4(a2),-2(A6)
;;   with pt, t do
        movea.l         12(A6),a2
;;     begin
;;      if yaw <> 0 then
        tst.w           -6(A6)
        beq.s           yawZero
;;      BigRot(x, z, -yaw);
        move.l          a2,a3           ;set ptr to x
        lea             4(a2),a4        ;set ptr to z
        move.w          #3600,d7        ;set ang to 3600-yaw
        sub.w           -6(a6),d7       ; (-yaw)
        jsr.w           BigRot
yawZero
;;      if pitch <> 0 then
        tst.w           -4(A6)
        beq.s           pitchZero
;;      BigRot(y, z, -pitch);
        lea             2(a2),a3        ;set ptr to y
        lea             4(a2),a4        ;set ptr to z
        move.w          #3600,d7        ;set ang to 3600-pitch
        sub.w           -4(A6),d7       ; (-pitch)
        jsr.w           BigRot
pitchZero
;;      if roll <> 0 then
        tst.w           -2(A6)          ;roll = 0?
        beq.s           rollZero        ; yes.
;;      BigRot(x, y, -roll);
        move.l          a2,a3           ;set ptr to x
        lea             2(a2),a4        ;set ptr to y
        move.w          #3600,d7        ;set ang to 3600-roll
        sub.w           -2(A6),d7       ; (-roll)
        jsr.w           BigRot
rollZero
;;     end;
;;   end; { Rotate }
        movem.l         (SP)+,a0-a4/d0-D7
        unlk            A6
        movea.l         (SP)+,A0
        addq.l          #8,SP
        jmp             (A0)
        dc.b    'BIGUNROT'
        ALIGN   2
        dc.w    0


; AngleProc(sin, cos: LongInt; TabPtr: Ptr): LongInt;
; Given a sine and cosine, return the correct angle.
; angle takes a sin and cosine of an angle and looks up an angle with
; a resolution of 1/10 of a degree.

; It does this by converting the sin and cosint to a function that is
; close to an angle, anf then using a look-up table to finish the
; conversion. The function is described in Sedgewick's Algorithms
```

000023

```
; Orig code by Young Harvill, 9/13/89.
; Dissasembled and converted to MPW.a by Chuck

ThetaResol      equ     2000

        AssHead
        EXPORT AngleProc
AngleProc
        move.l  (sp)+, a1               ; pull return addr
        move.l  (sp)+, a0               ; pull table addr.
        MOVE.L  (A7)+,D1                ; pull cos
        MOVE.L  (A7)+,D2                ; pull sine
        MOVE.L  D3,-(A7)
        MOVE.L  D4,-(A7)
        MOVE.L  D1,D0
        OR.L      D2,D0
        BNE.S    L000E
        MOVEQ    #$00,D0
        BRA.S    L004A
L000E   MOVE.L  D1,D0
        MOVE.L  D2,D3
        TST.L    D0
        BPL.S   L0018
        NEG.L   D0
L0018   TST.L   D3
        BPL.S   L001E
        NEG.L   D3
L001E   ADD.L   D0,D3
        MOVE.L  #ThetaResol,D0
        MOVE.L  D2,D4
        MULS.W  D0,D4
        DIVS.W  D3,D4
        EXT.L   D4
        TST.L   D1
        BPL.S   L003E
        MOVE.L  #ThetaResol*2,D0
        SUB.L   D4,D0
        EXG       D0,D4
        BRA.S   L0048
L003E   TST.L   D2
        BPL.S   L0048
        ADDI.L  #ThetaResol*4,D4
L0048   MOVE.L  D4,D0
L004A   MOVE.L  (A7)+,D4
        MOVE.L  (A7)+,D3
;       MOVE.L  D0,-(A7)
;       MOVE.L  #$00000000,-(A7)
;       MOVE.L  #'CSTB',-(A7)
;       MOVE.W  #131,-(A7)
;       _GetResource
;       moveq   #0,d0
;       TST.L   (A7)
;       BMI.S   exit
;       MOVEA.L (A7)+,A0
;       MOVE.L  (A7)+,D0
        ASL.L   #$1,D0
;       MOVEA.L (A0),A0
        MOVE.W  $00(A0,D0.W),D0

exit
        move.l  d0, (sp)        ; and save function result.
        jmp     (a1)
```

000024

T

```
AssEnd  ANGLEPROC
end
```

```
typedef struct
{
  short len;
  Ptr   addr;
} WDS_Struct;

/* This is all the information needed to do async read's and writes to
   one SGI. BE thinks this structure is no more than 250 bytes.  If that
   changes then you have to change the const in BE EtherGlue.pas */
typedef struct {
  long     outAddr;
  short    ReadHere;   /* count, num of reads in da buff. */
  struct UDPiopb    UDPin, UDPout;
  StreamPtr PtrtoStreamMem;
  StreamPtr udpStream;
  WDS_Struct  rWDS[2], wWDS[2];
} UDP_info, *UDP_infoPtr;


pascal short OpenEtherDriver(char*);

pascal short ET_Open(UDP_infoPtr);

pascal short ET_ReadsPending(UDP_infoPtr);

pascal short ET_Read(UDP_infoPtr, Ptr, long*, long*, Boolean);

pascal short ET_Write(UDP_infoPtr, Ptr, long*, long, Boolean);

pascal short ET_Close(UDP_infoPtr);
```

```
/*   Test the pascal udp routines in c. */

#include <strings.h>
#include <storage.h>
#include <Ctype.h>
#include <stdio.h>


#ifndef NULL
#define NULL 0l
#endif

#include "MacTcpCommonTypes.h"
#include "TCPPB.h"
#include "UDPPB.h"
#include "Strm_Echo.h"
#include "UDPLib.h"

#include "UDPInterface.h"

#define DRIVERNAME  "\p.ipp"

#define SGI_ADDR  0XC02AAC04
#define WHO_ADDR  -1

UDP_info    udp;

short packet[] = { 6, 1, 100 };
short change[] = { 20, 4, -1, 1, 0x126, 0x3, 0, 0x474, 0x0, 0xf718 };

dofor()
{
  short i, k, err;
  long  count, whoPort, before, after;
  short buff[100];

  before = TickCount();
  for (i=0; i < 100; i++) {
  count = packet[0];
    err = ET_Write(&udp, (Ptr)&packet, &count, WHO_ADDR, false);
    if (err) printf("ET_Send error %d",err);

    if (true) {
      do {
        k = ET_ReadsPending(&udp);
  /*      printf("ET_ReadsPending(&udp) = %d\n",k);   */
      } while (!k);
      count = 200;
      err = ET_Read(&udp, (Ptr)buff, &count, &whoPort, false);
      if (err) printf("ET_Read error %d",err);
    }
  }
}

/* Act like what BodyElectric does.  repeat sending changes to the SGI,
  waiting for a response, send change, wait, etc. */
fakeBE()
{
  short i, k, err;
  long  count, whoPort, before, after;
  short buff[100];

  printf("Acting like BodyElectric...\n");
```

000027

```
  printf("Hit the mouse to stop.\n");
  before = TickCount();
  do {
    /* write out a new change packet to the SGI. */
    count = change[0];
    err = ET_Write(&udp, (Ptr)&change, &count, WHO_ADDR, false);
    if (err) printf("ET_Send error %d",err);

  /*  do {
      k = ET_ReadsPending(&udp);
      if (false)
        printf("ET_ReadsPending(&udp) = %d\n",k);
    } while (!k);
    count = 200;
    err = ET_Read(&udp, (Ptr)buff, &count, &whoPort, false);
    if (err) printf("ET_Read error %d",err);  */
  } while (!Button());
}


main()
{
  short i, k, err, finished = false;
  long  count, whoPort, before, after;
  short buff[100];

  err = OpenEtherDriver(DRIVERNAME);
  if (err) printf("OpenEtherDriver error %d",err);
  err = ET_Open(&udp);
  if (err) printf("ET_Open error %d",err);
  while (!finished) {
    printf("b = fake BE, f = for   , . - stop.\n");
    k = getc(stdin); printf("\n");
    switch (k) {
      case '.' :
        finished = true;
        break;
      case 'b' :
        fakeBE();
        break;
      case 'f' :
        dofor();
        break;
    }
  }

  err = ET_Close(&udp);
  if (err) printf("ET_Close error %d",err);
}
```

```
/*************************************************************************

  String routines for use by Announce.c so I don't have to
  use 'c' libraries.  They get confused with pascal libraries.

*************************************************************************/

/* String routines in SomeStrings.c */
int strlen(char*);
char *strcpy(char*,char*);

strlen(s)
register char *s;
{
char *s0 = s;

  while (*s++);
  return (s-s0-1);
}

char *strcpy(s1,s2)
register char *s1, *s2;
{
char *s = s1;

  while (*s1++=*s2++);

  return (s);
}

char *strncpy(char*, char*, int);
char *strncpy(s1, s2, n)
register char *s1, *s2;
register int n;
{
char *s0 = s1;

  if (n > 0)
  {
    while (n-- && (*s1++ = *s2++));

    while (n>0)
    { /* pad out to n chars -- H&S specs it this way... */

      *s1++ = '\0';
      n--;
    }
  }

  return (s0);
}

char *PtoCstr(s)
register char *s;
{
  register char   *s0 = s;
  register int  i;

  for (i= (unsigned char)*s; i; i--, s0--)
    *s0 = *(s0+1);
  *s0 = 0;
  return s;
}
```

6/1/90 17:02 someStrings.c Page 2

```
char *CtoPstr(s)
register char *s;
{
  register char   *s1 = s;
  register int  i=0,j;

  while (*s1) {
    s1++; i++;
  }
  j=i;
  for (j=i; j ; j--, s1--) {
    *s1 = *(s1-1);
  }
  *s = i;
  return s;
}
```

```
/***************************************************

        AutoWindow.h

        Header file for AutoWindow.c

        Chuck Blanchard 1/13/88
        Copyright 1986 VPL Research, Inc.

***************************************************/


/* Definition of an AutoType structure.  AddAutoWind() returns a handle
    to the calling procedure so you need this header to customize an
    autowindow.   */

typedef struct AutoType {
  WindowPtr   wp;
  struct AutoType   **next;
  void  (*contProc)();
  void  (*keyProc)();
  void  (*updateProc)();
  void  (*activeProc)();
  void  (*growProc)();
  void  (*dragProc)();
  void  (*closeProc)();
  void  (*openProc)();
  Rect        growRect, dragRect;
  short       dyItem;
} AutoType, *AutoPtr, **AutoHandle;
```

```
/* Protoypes grabbed from file
** "AutoWindow.c"
** 1989 Jan 3 (Tue) 12:06:52
*/

/* Pascal routines Announce calls */

pascal Boolean CheckOnScreen (WindowPtr wp);
pascal void SaveWindState(WindowPtr wp, short resID);
pascal AutoHandle AddAutoWind(WindowPtr wp);

/* String routines in SomeStrings.c */
int strlen(char*);
char *strcpy(char*,char*);
char *strncpy(char*, char*, int);

/* Routines in Announce.c */

static char *NextStr(char *str);

static char *PrevStr(char *str);

static AddLine(char *str);    /* add a string to the text buffer. */

static void CalcLine(void);

static long CalcBefore(void);

static void SetScrollBar(void);

static ScrollAnnounce(int dir, Boolean draw);

static void ScrolltoLast(Boolean disp);

pascal void Announce(Str255 *str);

pascal void AnnounceB(Str255 *str);

static void DrawNoClip(void);

static void DrawAnnounce(void);

static pascal void UpdateAnnounce(WindowPtr wp, EventRecord *evt);

static pascal void ActiveAnnounce(WindowPtr wp, EventRecord *evt);

static pascal void ScrollAction(ControlHandle cH, short partCode);

static void inScrollBar(int part, Point pt);

pascal void ContAnnounce(WindowPtr wp, EventRecord *evt);

pascal void GrowAnnounce(WindowPtr wp, EventRecord *evt);

pascal void DragAnnounce(WindowPtr wp, EventRecord *evt);

pascal void KeyAnnounce(WindowPtr wp, EventRecord *evt);

pascal void InitAnnounce(void);

pascal void CloseAnnounce(void);

pascal void ChangeAnnounce(Boolean on);
```

```
/**********************************************************

  First try at UDP interface for BodyElectric.
  © VPL Research, Inc.
  Chuck Blanchard 5/2/89

**********************************************************/

#include <strings.h>
#include <storage.h>
#include <Ctype.h>

#ifndef NULL
#define NULL 0l
#endif

#include "MacTcpCommonTypes.h"
#include "TCPPB.h"
#include "UDPPB.h"
#include "Strm_Echo.h"
#include "UDPLib.h"

#include "UDPInterface.h"

#define BUFF_SIZE      8*1024
#define VALID          0xC0
#define LOCAL_PORT     0x00
#define TIME_OUT       2
#define SGI_Rem_PORT   1293


short          RefNum;          /* Global driver open var*/

/*________________________________________________________________________________

  Open the Driver for Ethertalk.
*/

pascal short OpenEtherDriver(str)
char    *str;
{
  OSErr err;
  IOParam iopb;

  iopb.ioCompletion=0L;
  iopb.ioNamePtr = (StringPtr)str;
  iopb.ioPermssn = fsCurPerm;

  err = PBOpen(&iopb, false);

  if (err == noErr) {
    RefNum = iopb.ioRefNum;
  }
  return err;
}

/*
________________________________________________________________________________
*/

pascal void UDP_ASR (StreamPtr udpStream, unsigned short eventCode,
                     Ptr userDataPtr, struct ICMPReport  *icmpMsg);
```

```
pascal void UDP_ASR (udpStream, eventCode, userDataPtr, icmpMsg)
StreamPtr             udpStream;
unsigned short        eventCode;
Ptr                   userDataPtr;
struct ICMPReport     *icmpMsg;
{
  UDP_infoPtr     infoptr;

  infoptr = (UDP_infoPtr) userDataPtr;
  infoptr->ReadHere++;
}

pascal short ET_ReadsPending(infoPtr)
UDP_infoPtr   infoPtr;
{
  return infoPtr->ReadHere;
}

/*
----------------------------------------------------------------------------
*/


pascal short ET_Open(infoPtr)
UDP_infoPtr     infoPtr;
{
  OSErr   err;

  infoPtr->PtrtoStreamMem =(StreamPtr) NewPtr(BUFF_SIZE);
  if (!infoPtr->PtrtoStreamMem) return memFullErr;

  infoPtr->ReadHere = 0;
  infoPtr->UDPin.ioCompletion                   = NULL;
  infoPtr->UDPin.ioCRefNum                      = RefNum;
  infoPtr->UDPin.csCode                         = UDPCreate;
  infoPtr->UDPin.csParam.create.rcvBuff         = (Ptr)infoPtr->PtrtoStreamMem;
  infoPtr->UDPin.csParam.create.rcvBuffLen      = BUFF_SIZE;
  infoPtr->UDPin.csParam.create.notifyProc      = UDP_ASR;
  infoPtr->UDPin.csParam.create.localPort       = LOCAL_PORT;
  infoPtr->UDPin.csParam.create.userDataPtr     = (Ptr)infoPtr;
  err = PBControl(&infoPtr->UDPin, false);
  if (err != noErr) return err;
  infoPtr->udpStream = infoPtr->UDPin.udpStream;

  return(err);
}

/*
----------------------------------------------------------------------------
*/

pascal short ET_Read(infoPtr, buffPtr, countPtr, addrPtr, async)
UDP_infoPtr     infoPtr;
Ptr             buffPtr;
long            *countPtr;
long            *addrPtr;
Boolean         async;
{
  OSErr   err;
  long    max = *countPtr;

  infoPtr->UDPin.udpStream              = infoPtr->udpStream;
  infoPtr->UDPin.ioCompletion           = NULL;
```

```
  infoPtr->UDPin.ioCRefNum              = RefNum;
  infoPtr->UDPin.csCode                 = UDPRead;
  infoPtr->UDPin.csParam.receive.secondTimeStamp    = 0;
  infoPtr->UDPin.csParam.receive.timeOut        = TIME_OUT;

  err=PBControl(&infoPtr->UDPin, async);
  if (infoPtr->ReadHere > 0)    /* If ReadHere count positive then */
    infoPtr->ReadHere--;        /* decrement it by one. */

  if (err == noErr) {
    *countPtr = infoPtr->UDPin.csParam.receive.rcvBuffLen;
    *addrPtr = infoPtr->UDPin.csParam.receive.remoteHost;

    if (max > *countPtr) max = *countPtr;
    BlockMove(infoPtr->UDPin.csParam.receive.rcvBuff,buffPtr, max);

  /* return buffer for our use */

    infoPtr->UDPin.ioCompletion = NULL;
    infoPtr->UDPin.ioCRefNum      = RefNum;
    infoPtr->UDPin.csCode          UDPBfrReturn;

    err = PBControl(&infoPtr->UDPin, async);
  }
  return err;
}

/*
-------------------------------------------------------------------------------
*/

pascal short ET_Write(infoPtr, buffPtr, countPtr, whoAddr, async)
UDP_infoPtr     infoPtr;
Ptr             buffPtr;
long            *countPtr, whoAddr;
Boolean         async;
{
  OSErr   err;

  infoPtr->wWDS[0].len = *countPtr;
  infoPtr->wWDS[0].addr = buffPtr;
  infoPtr->wWDS[1].len = 0;

  infoPtr->UDPout.udpStream                    = infoPtr->udpStream;
  infoPtr->UDPout.ioCompletion                 = NULL;
  infoPtr->UDPout.ioCRefNum                    - RefNum;
  infoPtr->UDPout.csCode                       - UDPWrite;
  infoPtr->UDPout.csParam.send.remoteHost        whoAddr;
  infoPtr->UDPout.csParam.send.remotePort      = SGI_Rem_PORT;
  infoPtr->UDPout.csParam.send.wdsPtr          = (Ptr)&infoPtr->wWDS;
  infoPtr->UDPout.csParam.send.checkSum        = 0;
  infoPtr->UDPout.csParam.send.sendLength      = 0;
  infoPtr->UDPout.csParam.send.userDataPtr     = (Ptr)infoPtr;


  err = PBControl(&infoPtr->UDPout, async);
  return err;
}

/*
-------------------------------------------------------------------------------
*/

pascal short ET_Close(infoPtr)
```

```
UDP_infoPtr      infoPtr;
{
  OSErr   err;

  infoPtr->UDPin.udpStream          = infoPtr->udpStream;
  infoPtr->UDPin.ioCompletion       =  NULL;
  infoPtr->UDPin.ioCRefNum          =  RefNum;
  infoPtr->UDPin.csCode             =   UDPRelease;
  infoPtr->UDPin.csParam.create.userDataPtr    =   NULL;

  err = PBControl(&infoPtr->UDPin, false);

  DisposPtr(infoPtr->PtrtoStreamMem);

}

/* Uncomment this an run to find the size of TCP_info.
main()
{
UDP_info  tc;

}

*/
```

```
/****************************************************************
  Here is my Announce window set up to be an AutoWindow.  All the
  main program has to do is call InitAnnounce() and the in the
  main event loop call isAutoWind(evt).

  This version of Announce is for LSP.

  procedure Announce(str: string);
  procedure AnnounceB(str: string);
  procedure InitAnnounce;
  procedure CloseAnnounce;
  procedure AnnounceWind(on: Boolean);

****************************************************************/

#include "AutoWindow.h"
#include "Announce.p"

#ifndef NULL
#define NULL 01
#endif


#define     messWindID    2000
extern WindowPtr    AnnounceWPtr;     /* pointer to the message window. */

#define     TEXT_SIZE     (5*1024)
char        *TextBase, *TailPtr, *firstDisp, *lastDisp, *LOGeob;
int         LineCount, LineHeight;
ControlHandle   VScrollH;

/* Return a ptr to the next string after the given one in the buffer. */
static char *NextStr(str)
char  *str;
{
  char  *p = str;
  p += strlen(p) + 1;
  if (p == TailPtr) {
    return str;
  }
  if (p >= LOGeob) p = TextBase;
  return p;
}

/* Return a ptr to the previous string in the buffer before this one. */
static char *PrevStr(str)
char  *str;
{
  char    *p = str;

  p = str - 2;
  if (p <= TextBase) {
    p = LOGeob - 2;
    if (p == TailPtr - 2) return str;
  }
  while (*p) p--;
  p++;
  if (p == TailPtr) return str;
  else return p;
}
```

```
static  AddLine(pstr)   /* add a pascal string to the text buffer. */
char      *pstr;
{
  char    *copyto;
  int     len;

  len = (unsigned char) *pstr - 1;    /* first char of pascal str is the len. */
  if (TailPtr + len < TextBase + TEXT_SIZE) {
    copyto = TailPtr;
    TailPtr += len;
    if (LOGeob < TailPtr) LOGeob = TailPtr;
  }
  else {    /* wrap around to the first part of the buffer. */
    LOGeob = TailPtr;
    TailPtr = TextBase;
    copyto = TailPtr;
    TailPtr = TextBase + len;
  }
  pstr++;
  strncpy(copyto, pstr,len-1);
  copyto += len-1;
  *copyto = 0;
}

/* Calculate LineCount and LineHeight for the message window. */
static void CalcLine()
{
  int          i,height;
  FontInfo     fi;
  GetFontInfo(&fi);

  LineHeight = (fi.ascent + fi.descent);
  height = AnnounceWPtr->portRect.bottom - AnnounceWPtr->portRect.top - (LineHeight / 2);
  LineCount = height / LineHeight;
  firstDisp = lastDisp;
  for (i=1; i < LineCount; i++) firstDisp = PrevStr(firstDisp);
}

/* Return how many bytes are before the firstDisp (between TailPtr
   and firstDisp) */
static long CalcBefore()
{
  if (firstDisp < TailPtr)
    return  (long)firstDisp - (long)TextBase + (long)LOGeob - (long)TailPtr;
  else return  (long)firstDisp - (long)NextStr(TailPtr);
}

/* Calculate what the range of the scroll bar is and where it should
   be based on where firstDisp is compared to TailPtr. */
static void SetScrollBar()
{
  int   displayed;
  char  *p;

  if (lastDisp < firstDisp)
    displayed = (long)lastDisp - (long)TextBase + (long)LOGeob - (long)firstDisp;
  else displayed = (long)lastDisp - (long)firstDisp;
  p = PrevStr(LOGeob);
  SetCtlMax(VScrollH, p - TextBase - displayed);
  SetCtlValue(VScrollH, CalcBefore());
}

/* Scroll the announce window by the given dir (neg or pos)
   if draw is true then redraw the window. */
```

6/1/90 17:02 Announce.c Page 3

```
static ScrollAnnounce(dir,draw)
int     dir;
Boolean draw;
{
  char        *p, *p1;
  int         i, count=0;
  RgnHandle   rgn, oldclip = NULL;
  Rect        r;

  if (dir < 0) {     /* dir neg means scroll toward the beginning */
    p = firstDisp;
    while (dir++) {
      p1 = PrevStr(p);
      if (p1 != p) count--;
      p = p1;
    }
    if (p != firstDisp) {
      firstDisp = p;
      for (i=count;i<0;i++) lastDisp = PrevStr(lastDisp);
      if (draw) {
        if (count > -LineCount) {
          oldclip = NewRgn();
          GetClip(oldclip);
          rgn = NewRgn();
          r = AnnounceWPtr->portRect;
          r.right -= 16;
          ScrollRect(&r, 0, LineHeight * (-count), rgn);
          DisposeRgn(rgn);
          r.bottom = LineHeight * ((-count)-1);
          ClipRect(&r);
        }
        if (oldclip != NULL) DrawNoClip();
        else DrawAnnounce();
      }
    }
  }
  else if (dir > 0) {
    p = lastDisp;
    while (dir--) {
      p1 = NextStr(p);
      if (p1 != p) count++;
      p = p1;
    }
    if ( p != lastDisp ) {
      lastDisp = p;
      for (i=0;i<count;i++) firstDisp = NextStr(firstDisp);
      if (draw) {
        if (count < LineCount) {
          oldclip = NewRgn();
          GetClip(oldclip);
          rgn = NewRgn();
          r = AnnounceWPtr->portRect;
          r.right -= 16;
          ScrollRect(&r, 0, LineHeight * -count, rgn);
          DisposeRgn(rgn);
          r.top += (LineHeight * (LineCount-count));
          ClipRect(&r);
        }
        if (oldclip != NULL) DrawNoClip();
        else DrawAnnounce();
      }
    }
  }
  if (oldclip) {        /* oldclip non-zero only if has drawn.  restore */
```

000039

```
    SetClip(oldclip);   /* the old clip region. */
    DisposeRgn(oldclip);
  }
  return count;
}

/* Scroll as far as you can to the last line saved. */
static void ScrolltoLast(disp)
Boolean   disp;
{
  char    *oldfirst;
  do {
    oldfirst = firstDisp;
    ScrollAnnounce(100,disp);
  } while (oldfirst != firstDisp);
}

pascal void Announce(str)
Str255    *str;
{
  GrafPtr     OldPort;
  RgnHandle   rgn, oldclip;
  int         i;
  Rect        r;
  WindowPeek  wp;

  GetPort(&OldPort);
  SetPort(AnnounceWPtr);
  TextSize(9);
  AddLine((char*)str);
  ScrolltoLast(true);
  SetScrollBar();
  SetPort(OldPort);
}  /* Announce */

pascal void AnnounceB(str)
/* Announce with a sysbeep */
Str255    *str;
{
  SysBeep(3);
  Announce(str);
}

long      aprRtn;
Str255    aprStr;

static void DrawNoClip()
{
  char      *p;
  int       i,l;

  p = firstDisp; l = LineHeight;
  for (i=0; i< LineCount; i++) {
    MoveTo(2,l);
    DrawText(p, 0, strlen(p));
    p = NextStr(p);
    l += LineHeight;
  }
}
/* Draw the text in the Announce window. */
static void DrawAnnounce()
{
  RgnHandle oldclip;
  Rect      r;
```

```
  if (TextBase) {
    r = AnnounceWPtr->portRect;
    r.right -= 16;
    oldclip = NewRgn();
    GetClip(oldclip);
    ClipRect(&r);
    EraseRect(&r);
    DrawNoClip();
    SetClip(oldclip);
  }
}   /* DrawAnnounce */

/* Update the Announce window. */
pascal void UpdateAnnounce(wp,evt)
WindowPtr     wp;
EventRecord   *evt;
{
  GrafPtr   oldport;
  Rect      r;

  GetPort(&oldport); SetPort(AnnounceWPtr);
  EraseRect(&wp->portRect);
  if (TextBase) {
    DrawGrowIcon(AnnounceWPtr);    /* Draw the vert & horz scroll lines */
    r = AnnounceWPtr->portRect;
    r.top = r.bottom - 16;     /* Then erase the horz one. */
    r.right -= 15;
    EraseRect(&r);

    if (FrontWindow() == AnnounceWPtr) DrawControls(AnnounceWPtr);
    DrawAnnounce();
  }
  SetPort(oldport);
}   /* UpdateAnnounce */

/* Activate the Announce window. */
pascal void ActiveAnnounce(wp,evt)
WindowPtr     wp;
EventRecord   *evt;
{
  GrafPtr   oldport;
  RgnHandle oldClip;
  char      *p;
  int       i,l;
  Rect      r;

  GetPort(&oldport); SetPort(AnnounceWPtr);

  oldClip = NewRgn();
  GetClip(oldClip);
  r = wp->portRect;
  r.left = r.right - 15;
  ClipRect(&r);
  if (evt->modifiers & activeFlag) {
    ShowControl(VScrollH);
    DrawControls(wp);
  }
  else {
    EraseRect(&r);
    HideControl(VScrollH);
  }
  DrawGrowIcon(wp);
  SetClip(oldClip);
```

```
  DisposeRgn(oldClip);
  SetScrollBar();
  SetPort(oldport);
}

pascal void ScrollAction (cH,partCode)
ControlHandle cH;
short         partCode;
{
  int   dir;

  switch (partCode) {
    case inUpButton:
      dir = -1;
      break;
    case inDownButton:
      dir = 1;
      break;
    case inPageUp:
      dir = -(LineCount-1);
      break;
    case inPageDown:
      dir = LineCount-1;
      break;
    default:
      dir = 0;
  }
  ScrollAnnounce(dir,true);
  SetScrollBar();
}

static void inScrollBar(part,pt)
int     part;
Point   pt;
{
  short          i;
  ControlHandle  ctl;
  int            newbefore, before;
  char           *oldfirst;

  if ( part == inThumb ) {
    part = TrackControl(VScrollH, pt, NULL);
    if ( part == inThumb ) {
      newbefore = GetCtlValue(VScrollH);  /* new number of bytes to try for. */
      before = CalcBefore();             /* crnt num of bytes before firstDisp. */
      if ( newbefore == GetCtlMax(VScrollH) ) {
        /* special case, scroll to end of text */
        ScrolltoLast(false);
      }
      else if (newbefore < before) {    /* scroll down in mem until newbefore found. */
        oldfirst = 0;
        while (newbefore < before && oldfirst != firstDisp) {
          oldfirst = firstDisp;
          ScrollAnnounce(-1,false);
          before = CalcBefore();
        }
      }
      else {  /* scroll up in mem until newbefore found. */
      oldfirst = 0;
        while (newbefore - 20 > before && oldfirst != firstDisp) {
          oldfirst = firstDisp;
          ScrollAnnounce(1,false);
          before = CalcBefore();
        }
```

000042

```
      }
      SetScrollBar();
      DrawAnnounce();
    }
  }
  else {
    part = TrackControl(VScrollH, pt, ScrollAction);
    SetScrollBar();
  }
}   /* if FindControl in VScrollH */

pascal void ContAnnounce(wp,evt)
WindowPtr      wp;
EventRecord    *evt;
{
  short           i;
  ControlHandle   ctl;

  GlobalToLocal(&evt->where);
  i = FindControl(evt->where, wp, &ctl);
  if ( ctl == VScrollH ) inScrollBar(i,evt->where);
}   /* ContAnnounce */

pascal void GrowAnnounce(wp,evt)
WindowPtr      wp;
EventRecord    *evt;
{
  int    i;

  SaveWindState(wp,messWindID);
  CalcLine();
  HideControl(VScrollH);
  MoveControl(VScrollH, wp->portRect.right - 15, wp->portRect.top - 1);
  SizeControl(VScrollH, 16, wp->portRect.bottom - wp->portRect.top - 13);
  ShowControl(VScrollH);
  InvalRect(&wp->portRect);
}

pascal void DragAnnounce(wp,evt)
WindowPtr      wp;
EventRecord    *evt;
{
  SaveWindState(wp,messWindID);
}

pascal void InitAnnounce()
{
#define monaco  4
#define RightSpace  50
  Rect        r;
  int         i,j;
  register     Ptr        p;
  AutoHandle  ah;
  GrafPtr     oldPort;
  Str255      str;
  WindowPeek  peek;
  WStateData  **WStateH;

  GetPort(&oldPort);
  AnnounceWPtr = GetNewWindow(messWindID, 0L, -1L);
  peek = (WindowPeek)AnnounceWPtr;
  if (peek->windowKind == 8 && peek->spareFlag) { /* zoomBox window */
    WStateH = (WStateData**)peek->dataHandle;
    (*WStateH)->stdState.right -= RightSpace; /* leave room for desktop icons. */
```

T

```
  }
  CheckOnScreen(AnnounceWPtr);
  SetPort(AnnounceWPtr);
  TextSize(9);
  TextFont(monaco);
  /* Make a text buffer instead of a bit buffer. */
  TextBase = NewPtr(TEXT_SIZE);
  p = TextBase;
  for (p=TextBase; p < TextBase+TEXT_SIZE; p++) *p = 0; /* Prime with blank lines. */
  TailPtr = &TextBase[200];
  LOGeob = TailPtr;
  lastDisp = TailPtr-1;
  CalcLine();
  ah = AddAutoWind(AnnounceWPtr);
  (*ah)->contProc = ContAnnounce;
  (*ah)->updateProc = UpdateAnnounce;
  (*ah)->growProc = GrowAnnounce;
  (*ah)->dragProc = DragAnnounce;
  (*ah)->activeProc = ActiveAnnounce;
  r = AnnounceWPtr->portRect;
  r.left = r.right - 15;
  r.top -= 1;
  r.right += 1;
  r.bottom -= 14;
  VScrollH = NewControl(AnnounceWPtr, &r, "\pV", false, 0, 0, 0, scrollBarProc, 0);

  SetPort(oldPort);
}       /* InitAnnounce() */

pascal void CloseAnnounce()
{
  Ptr     p;

  SetPort(AnnounceWPtr);
  SaveWindState(AnnounceWPtr, messWindID);
  p = TextBase;
  if (p) DisposPtr(p);
  CloseWindow(AnnounceWPtr);
}

/* Turn the announce window on or off based on the boolean. */
pascal void ChangeAnnounce(on)
Boolean on;
{
  WindowPeek  peek = (WindowPeek)AnnounceWPtr;

  if (on != peek->visible) {
    if (on) {
      ShowWindow(AnnounceWPtr);
      SelectWindow(AnnounceWPtr);
      SetPort(AnnounceWPtr);
    }
    else HideWindow(AnnounceWPtr);
  }
}
```

```
unit Announce;

interface

  uses
    AutoWindow;

  var
    MessWPtr: WindowPtr;

  procedure PtoCstr (var str: Str255);
  procedure CtoPstr (var str: Str255);

  procedure Announce (str: Str255);
  procedure AnnounceB (str: Str255);
  procedure InitAnnounce;
  procedure CloseAnnounce;
  procedure ChangeAnnounce (on: Boolean);

implementation

  procedure PtoCstr (var str: Str255);
  external;
  procedure CtoPstr (var str: Str255);
  external;
  procedure Announce;
  external;
  procedure AnnounceB;
  external;
  procedure InitAnnounce;
  external;
  procedure CloseAnnounce;
  external;
end.
```

```
{*****************************************************************}

{ AutoWindow . c - Automatically handle events }
{ for windows . (c) 1988 VPL Research, Inc. }
{ ver 1.2 Chuck Blanchard 11/27/88 }

{ InitAutoWind ( ); }
{ AutoHandle AddAutoWind ( WindowPtr wp ); }
{ DelAutoWind ( WindowPtr wp ); }
{ bool isAutoWind ( EventRecord event ); }
{ }
{ This is a }
{ set of utilities }
{ to automatically route events }
{ for for windows to the proper place . }
{ For window 's this can be set up to }
{ handle the following events : contProc - mouseDown in content }
{ keyProc - keyDown , autoKeyDown }
{ updateProc - updateEvt }
{ activeProc - activateEvt }
{ growProc - mouseDown in growRgn }
{ closeProc - mouseDown in close . }
{ openProc - Window just opened }
{ with the Windows menu . }
{ For all the events , }
{ if the proc is NULL the event won 't be handled. }
{ If the proc := - 1l }
{ then the event will be handled or ignored . isAutoWind will return true as }
{ if it handled the event . This is the way things are configured initially . So after calling AddAutoWind ( ) the
        window will be dragged , closed , zoomed , resized and closed . All update , activate , mouse , and
        key events }
{ for the window will be ignored . AddAutoWind ( ) returns a handle to the AutoType . Install your own }
{ procedure addresses }
{  to the procedures you wish to handle . Window 's are automatically dragged and zoomed. }
{  All the procedures are passed the window and the event . yourProc ( WindowPtr wp , EventRecord evt ); }
{ }
{  If InitAutoWind is passed true , then a new menu called 'Windows' is added and the name of each window is
        added to the menu as it is added to the list . Selecting the window either brings it to the front or
        opens it .•}

{ 1.2 modifications - calls DynamicMenu automatically for menu mousedown's and cmd-keys. }

{*****************************************************************}

unit AutoWindow;

interface
  uses
    DynamicMenu;

{   Definition of an AutoType structure.  AddAutoWind() returns a handle }
{   to the calling procedure so you need this header to customize an }
{   autowindow.   }
```

I

```
 type
  AutoPtr = ^AutoType;
  AutoHandle = ^AutoPtr;
  AutoType = record
      wp: WindowPtr;
      next: AutoHandle;
      contProc: ProcPtr;
      keyProc: ProcPtr;
      updateProc: ProcPtr;
      activeProc: ProcPtr;
      growProc: ProcPtr;
      dragProc: ProcPtr;
      closeProc: ProcPtr;
      openProc: ProcPtr;
      growRect, dragRect: Rect;
      dyItem: integer;
    end;

 procedure InitAutoWind (MenuID: integer);
 function AddAutoWind (wp: WindowPtr): AutoHandle;
 function DelAutoWind (wp: WindowPtr): Boolean;
 function isAutoWind (evt: EventRecord): boolean;

implementation

 var
   AutoWRoot: AutoHandle;     { Handle to list of automatic windows. }
   AutoMenuH: MenuHandle;
{Screen stuff}
   AutoDragArea,        {holds the area where window can be dragged in}
   AutoGrowArea,        {holds the area to which a window's size can change}
   AutoScreen: Rect;          {holds the screen dimensions}

   lastRect: Rect;


{ if p is not -1 or 0 then call it passing window and event. }
 procedure callThis (wp: WindowPtr; evt: EventRecord; procAddr: ProcPtr);
 inline
   $205F,   { move.l  (a7)+,a0 }
   $4E90;   { jsr     (a0)     }

 procedure autocall (p: ProcPtr; wp: WindowPtr; evt: EventRecord);
   var
    oldPort: GrafPtr;

 begin
   if (ord4(p) <> -1) and (p <> nil) then
     begin
       GetPort(oldPort);
       SetPort(wp);
       callThis(wp, evt, p);
       SetPort(oldPort);
```

```
    end;
  end;

  procedure InitAutoWind; {(MenuID: integer)}
  begin
   { set the size of the screen }
    AutoScreen := screenBits.bounds;
    SetRect(AutoDragArea, AutoScreen.left + 4, AutoScreen.top + 24, AutoScreen.right - 4,
        AutoScreen.bottom - 4);
    SetRect(AutoGrowArea, 20, 20, AutoScreen.right, AutoScreen.bottom);
    AutoWRoot := nil;
    AutoMenuH := nil;
    if MenuID <> 0 then
      begin
        AutoMenuH := GetMenu(MenuID);
        if AutoMenuH = nil then
          AutoMenuH := NewMenu(MenuID, 'Windows');
        InsertMenu(AutoMenuH, 0);
        DrawMenuBar;
      end;
   end;

{ Return true and the AutoHandle if the given window pointer is in the }
{   AutoWind list. }
  function findAutoWind (wp: WindowPtr; var VARah: AutoHandle): boolean;
    var
      ah: AutoHandle;
      found: boolean;
  begin

    VARah := nil;
    ah := AutoWRoot;
    found := false;
    while (ah <> nil) and not found do
      begin
        if (ah^^.wp) = wp then
          begin
            VARah := ah;
            found := true;
          end
        else
          ah := ah^^.next;
      end;
    findAutoWind := found;
  end;

 {   This is the routine called by dynamicMenus when a 'Windows' item}
 {       is selected.  Find the associated window and open it. }
  procedure AutoMenuProc (dyItem: integer);
    var
      ah: AutoHandle;
      i: integer;
      wp: WindowPtr;
```

```
    evt: EventRecord;
    b: boolean;
  begin
    ah := AutoWRoot;
    while (ah <> nil) and (dyItem <> ah^^.dyItem) do
      ah := ah^^.next;
    if (ah <> nil) then
      begin                    { found the window this item goes with. }
        wp := ah^^.wp;
        if not WindowPeek(wp)^.visible then
          begin
            ShowWindow(wp);   { was off, turn on. }
            SelectWindow(wp);
            b := GetNextEvent(0, evt);
            autocall(ah^^.openProc, wp, evt);
          end
        else if wp <> FrontWindow then
          SelectWindow(wp);
      end;
  end;    { AutoMenuProc }


  function AddAutoWind; { (wp : WindowPtr) : AutoHandle }
    var
      i, j: integer;
      ah: AutoHandle;
      strh: StringHandle;
      peek: WindowPeek;
  begin
    if not findAutoWind(wp, ah) then
      begin       { first event/proc for this window }
        ah := AutoHandle(NewHandle(sizeof(AutoType)));
        ah^^.wp := wp;
        ah^^.next := nil;
        ah^^.dyItem := 0;
        if (AutoMenuH <> nil) then
          begin
            peek := WindowPeek(wp);
            strh := peek^.titleHandle;
            HLock(Handle(strh));
            i := dyNewItem(AutoMenuH, strh^^, Pointer(@AutoMenuProc), false);
            ah^^.dyItem := i;
            HUnlock(Handle(strh));
          end;
        ah^^.next := AutoWRoot;{ add to begining of existing list }
        AutoWRoot := ah;
        ah^^.contProc := ProcPtr(-1);
        ah^^.keyProc := ProcPtr(-1);
        ah^^.updateProc := ProcPtr(-1);
        ah^^.activeProc := ProcPtr(-1);
        ah^^.growProc := ProcPtr(-1);
        ah^^.dragProc := ProcPtr(-1);
        ah^^.closeProc := ProcPtr(-1);
```

```
      ah^^.openProc := ProcPtr(-1);
      ah^^.dragRect := AutoDragArea;
      ah^^.growRect := AutoGrowArea;
    end;
  AddAutoWind := ah;
 end;   { AddAutoWind }

{ If the given window pointer points to an auto window then delete it }
{      from the AutoWindow list.  Return true if it was deleted. }
 function DelAutoWind; { (wp : WindowPtr) : Boolean }
  var
    ah, ah1, ah2: AutoHandle;
    b: boolean;
 begin
  if findAutoWind(wp, ah) then
    begin          { this is an auto window. }
      if AutoWRoot = ah then                { first on the list, }
        AutoWRoot := ah^^.next              { so just change AutoWRoot. }
      else
        begin
          ah1 := AutoWRoot;                  { we know ah is in the list somewhere }
          ah2 := ah1^^.next;
          while (ah2 <> ah) do
            begin          { so traverse the list to find it. }
              ah1 := ah1^^.next;
              ah2 := ah1^^.next;
            end;
          ah1^^.next := ah2^^.next;   { and remove it from the list }
        end;{ else traverse the list }
      b := dyDelItem(nil, ah^^.dyItem);
      DisposHandle(Handle(ah));
    end;
  DelAutoWind := (ah <> nil);
 end;   { DelAutoWind }

{}
{{ If this mousedown event happened in an autowindow then handle it and}
{      return true, otherwise return false. }
 function AutoMouseDown (evt: EventRecord): Boolean;
  var
    wp: WindowPtr;
    ah: AutoHandle;
    i: integer;
    didit: boolean;
    r: Rect;
    rp: ^Rect;
    l, CodeWord: LongInt;
 begin
  didit := false;
  i := FindWindow(evt.where, wp);
  if i = inSysWindow then
    begin
      SystemClick(evt, wp);
```

```
      didit := true;
    end
  else if findAutoWind(wp, ah) then        { this is an AutoWindow }
    if wp <> FrontWindow then  { If it's not the front window }
      begin
        SelectWindow(wp);                  { then select it. }
        didit := true;
      end
    else
      case i of
        inGoAway:          { hide the window then call proc if }
          if TrackGoAway(wp, evt.where) and (ah^^.closeProc <> nil) then
            begin
              HideWindow(wp);     { there is one. }
              autocall(ah^^.closeProc, wp, evt);
              didit := true;
            end;
        inDrag:            { Just drag the window. }
          begin
            DragWindow(wp, evt.where, AutoDragArea);
            didit := true;
          end;
        inGrow:
          if (ah^^.growProc <> nil) then
            begin
              l := GrowWindow(wp, evt.where, ah^^.growRect);
              if (l <> 0) then
                begin
                  rp := @wp^.portRect;
                  SetRect(r, rp^.left, rp^.bottom - 16, rp^.right, rp^.bottom);
                  InvalRect(r);
                  SetRect(r, rp^.right - 16, rp^.top, rp^.right, rp^.bottom);
                  InvalRect(r);
                  SizeWindow(wp, LoWord(l), HiWord(l), true);
                  SetRect(r, rp^.left, rp^.bottom - 16, rp^.right, rp^.bottom);
                  InvalRect(r);
                  SetRect(r, rp^.right - 16, rp^.top, rp^.right, rp^.bottom);
                  InvalRect(r);
                end;
              autocall(ah^^.growProc, wp, evt);
              didit := true;
            end;{ if proc isn't nil }
        inContent:
          if (ah^^.contProc <> nil) then
            begin
              autocall(ah^^.contProc, wp, evt);
              didit := true;
            end;
        inZoomIn, inZoomOut:
          begin
            if TrackBox(wp, evt.where, i) then
              ZoomWindow(wp, i, true);
            autocall(ah^^.growProc, wp, evt);
```

```
          didit := true;
        end;
      end;  { if .. switch }
    AutoMouseDown := didit;
  end; { AutoMouseDown }

{   isAutoWind should be called in the main loop right after GetNextEvent.}
{•If it has a proc / event / window combination•}
{•for this event it will call the•}
{•procedure and return true .•}
{•otherwise•}
{• it will return false and the event should be proccessed as normal .•}
{}
  function isAutoWind; {(evt : EventRecord) : boolean }
    var
      didit: boolean;
      wp: WindowPtr;
      ah: AutoHandle;
      str: string;
      CodeWord: longInt;
      oldPort: GrafPtr;
  begin
    GetPort(oldPort);
    didit := false;
    case (evt.what) of
      mouseDown:
        didit := AutoMouseDown(evt);
      autoKey, keyDown:
        begin
          if BitAnd(cmdKey, evt.modifiers) = cmdKey then
            begin
              CodeWord := MenuKey(chr(bitAnd(evt.message, $FF)));
              didit := dyMenuID(HiWord(CodeWord), LoWord(CodeWord));
            end
          else
            begin { if not menukey }
              wp := FrontWindow;
              if findAutoWind(wp, ah) and (ah^^.keyProc <> nil) then
                begin
                  autocall(ah^^.keyProc, wp, evt);
                  didit := true;
                end;
            end;
        end;
      activateEvt:
        begin
          wp := WindowPtr(evt.message);
          if findAutoWind(wp, ah) and (ah^^.activeProc <> nil) then
            begin
              SetPort(wp);
              autocall(ah^^.activeProc, wp, evt);
              didit := true;
            end;
```

```
      end;
     updateEvt:
      begin
        wp := WindowPtr(evt.message);
        if findAutoWind(wp, ah) and (ah^^.updateProc <> nil) then
          begin
            BeginUpdate(wp);
{}
            SetPort(wp);
            EraseRect(wp^.portRect);
{}
            autocall(ah^^.updateProc, wp, evt);
            EndUpdate(wp);
            didit := true;
          end;
      end;
     otherwise
       ;
    end;      { switch }
    if not didit then
      SetPort(oldPort);
    isAutoWind := didit;
  end; { isAutoWind }

end.
```

07/18/89 16:28 bezier.pas Page 1

```
program Bezier_test;

 uses
   FixMath, bezier_types, bezier_utils;



 var
   myPoint: point;
   tempPtr, temp2: ptr;
   time: fixed;
   count, count2, pointX: integer;
   x, y: fixed;
   timeFr: fract;

   startStopDelta, lastThisDelta, thisNextDelta: point3;
   thisPt, nextPt, lastPt: point3;
   deltaPoint: point3;
   control1, control2: point3;

   tempPt: point3ex;
   lastHype, nextHype, tempHypeScale: real;
   startRect, stopRect: rect;
   tRect: rect;

begin

  showDrawing;

  point_array   := point3_array_ptr(newPtr(sizeof(point3_array)));
  actual_points  := point3_array_ptr(newPtr(sizeof(point3_array)));

  point_array^[1,  1].x  :=  long2fix(20);
  point_array^[1,  1].y  :=  long2fix(200);
  point_array^[1,  1].z  :=  long2fix(0);

  point_array^[2,  1].x  :=  long2fix(80);
  point_array^[2,  1].y  :=  long2fix(152);
  point_array^[2,  1].z  :=  long2fix(0);

  point_array^[3,  1].x  :=  long2fix(200);
  point_array^[3,  1].y  :=  long2fix(236);
  point_array^[3,  1].z  :=  long2fix(0);

  point_array^[4,  1].x  :=  long2fix(210);
  point_array^[4,  1].y  :=  long2fix(200);
  point_array^[4,  1].z  :=  long2fix(0);

{      MoveTo(point_array^[1].x,  point_array^[1].y);}
{      LineTo(point_array^[2].x,  point_array^[2].y);}
{      LineTo(point_array^[3].x,  point_array^[3].y);}
{      LineTo(point_array^[4].x,  point_array^[4].y);}
{      LineTo(point_array^[1].x,  point_array^[1].y);}
```

000054

I

```
code_ptr := load_code_res(bezier_code_id);

for pointX := 1 to 4 do
  begin

    thisPt := point_array^[pointX, 1];
    GetNextLast(pointX, nextPt, lastPt);

    calcDelta(nextPt, lastPt, startStopDelta);
    calcDelta(thisPt, lastPt, lastThisDelta);
    calcDelta(nextPt, thisPt, thisNextDelta);

    tempPt.x := fix2x(thisNextDelta.x);
    tempPt.y := fix2x(thisNextDelta.y);
    tempPt.z := fix2x(thisNextDelta.z);

{nextHype := sqrt((thisNextDelta.x * thisNextDelta.x) + (thisNextDelta.y * thisNextDelta.y) +
      (thisNextDelta.z * thisNextDelta.z));}

    nextHype := sqrt(fix2X(fixMul(thisNextDelta.x, thisNextDelta.x) + fixMul(thisNextDelta.y,
      thisNextDelta.y) + fixMul(thisNextDelta.z, thisNextDelta.z)));

    tempPt.x := fix2x(lastThisDelta.x);
    tempPt.y := fix2x(lastThisDelta.y);
    tempPt.z := fix2x(lastThisDelta.z);

{   lastHype := sqrt((lastThisDelta.x * lastThisDelta.x) + (lastThisDelta.y * lastThisDelta.y) +
      (lastThisDelta.z * lastThisDelta.z));}


    lastHype := sqrt(fix2X(fixMul(lastThisDelta.x, lastThisDelta.x) + fixMul(lastThisDelta.y,
      lastThisDelta.y) + fixMul(lastThisDelta.z, lastThisDelta.z)));

    if lastHype + nextHype <> 0 then
      tempHypeScale := (lastHype / (lastHype + nextHype)) / 3
    else
      tempHypeScale := 0;

    control1.x := thisPt.x - fixMul(startStopDelta.x, X2Fix(tempHypeScale));
    control1.y := thisPt.y - fixMul(startStopDelta.y, X2Fix(tempHypeScale));
    control1.z := thisPt.z - fixMul(startStopDelta.z, X2Fix(tempHypeScale));

    if lastHype + nextHype <> 0 then
      tempHypeScale := (nextHype / (lastHype + nextHype)) / 3
    else
      tempHypeScale := 0;

    control2.x := thisPt.x + fixMul(startStopDelta.x, X2Fix(tempHypeScale));
    control2.y := thisPt.y + fixMul(startStopDelta.y, X2Fix(tempHypeScale));
    control2.z := thisPt.z + fixMul(startStopDelta.z, X2Fix(tempHypeScale));

    actual_points^[pointX, 1] := thisPt;
```

```
    if (pointX - 1) > 0 then
      actual_points^[pointX - 1, 3] := control1;
    if pointX < 4 then
      actual_points^[pointX, 2] := control2;
  end;

 for pointX := 1 to 4 do
  begin
    SetRect(tRect, fix2long(actual_points^[pointX, 1].x) - 5, fix2long(actual_points^[pointX, 1].y) - 5,
      fix2long(actual_points^[pointX, 1].x) + 5, fix2long(actual_points^[pointX, 1].y) + 5);
    FillRect(tRect, black);

    if pointX < 4 then {}
      begin
        SetRect(tRect, fix2long(actual_points^[pointX, 2].x) - 2, fix2long(actual_points^[pointX, 2].y) - 2,
       fix2long(actual_points^[pointX, 2].x) + 2, fix2long(actual_points^[pointX, 2].y) + 2);
        FillRect(tRect, gray);

        SetRect(tRect, fix2long(actual_points^[pointX, 3].x) - 2, fix2long(actual_points^[pointX, 3].y) - 2,
       fix2long(actual_points^[pointX, 3].x) + 2, fix2long(actual_points^[pointX, 3].y) + 2);
        FillRect(tRect, gray);

      end;
  end;

{      MoveTo(point_array^[1].x, point_array^[1].y);}
{LineTo(midPoint1.x, midPoint1.y);}
{LineTo(midPoint2.x, midPoint2.y);}
{LineTo(point_array^[2].x, point_array^[2].y);}

   { MoveTo(point_array^[pointX].x, point_array^[pointX].y);}

  for count2 := 0 to 2 do
   begin
{tempPtr := ptr(actual_points);}

     tempPtr := ptr(ord4(actual_points) + (count2 * (sizeof(fixed) * 9)));
     MoveTo(fix2long(point_array^[count2 + 1, 1].x), fix2long(point_array^[count2 + 1, 1].y));
     for count := 1 to 15 do
       begin
         time := fixRatio(count, 16);

         x := bezier_curve(tempPtr, time, code_ptr);

         temp2 := ptr(ord4(tempPtr) + (sizeof(fixed)));
         y := bezier_curve(temp2, time, code_ptr);

         myPoint.h := fix2long(x);
         myPoint.v := fix2long(y);

         LineTo(myPoint.h, myPoint.v);

       end;
```

```
    if count2 + 2 < 4 then
      MoveTo(fix2long(point_array^[count2 + 2, 1].x), fix2long(point_array^[count2 + 2, 1].y));

  end;
end.
```

T

```
unit bezierDM;
interface
  uses
    FixMath, SANE, ChuckStuff, AutoLib, FastStuff, Globals, Tree3DGlob, {}
    MiscRoutines, formTree3D, Tree3D, DMTypes, DMGlobals, PointDMs;

  var
    bezierCodePtr: ptr;

  procedure load_code_res;
  procedure doBezier (var dm: dmRec);
  procedure HandleBezier (v: DMVerb; var dm: DMRec);

implementation
  const
    bezierCodeID = 6000;

  type
    bezierPt = array[1..3] of fixed;
    bezierPtPtr = ^bezierPt;
    bezierStation = array[1..3] of bezierPt;
    BigBezier = array[1..3000] of bezierStation;      { Array of stations. }
    bezierPtr = ^BigBezier;

{refer to it like this:}
{     bezierPtr ^[ station number, ( 1 point, 2 control1, 3 control2), (1 x, 2 y, 3 z) ] - Scotts comment:
        CLB. }

{   BigBezier is an array of stations.  Each station is a control point. }
{     bezierPtr^[counter1, 1, 1] := long2fix(thisNode^.gPt.x);        }

    { What to do with rotation values? }
    RotType = (NoRot, PointRot, Tangent);
    { What does this do at the end of the path? }
    EndBehaviorType = (endStop, endLoop, endAgain, endReverse);

    { The BezierState record lays over the dm's privateWords.  It has the bezier state. }
    BezierState = packed record
        nodePosition,                 { current node index in the path  (0..nodeCount-1). }
        stepPosition,                 { current step index between nodes. }
        nodeCount,                       { number of nodes in the path. }
        lastChange: integer;          { Last value of SlotsIn[3] which must change for the bez to go. }
        isGoing: Boolean;             { true if going to next station. }
        goDown: Boolean;              { true if the point list goes down else it goes right. }
        posAxis: Boolean;                { true if Tangent follow on a positive axis }
        rotate: RotType;
        axis: WhichAxis;
        endBehave: EndBehaviorType;
        crntDir: integer;
      end;
    BezStatePtr = ^BezierState;

{bezier inputs :}
```

```
{       1:  1st control point                     1: point to change}
{       2:  speed                                    2: changed (0 or 1)}
{       3:  go to next station (boolean)          3: current station index. }
{       4:  go +- or not at all }

  procedure rehookBezier (var dm: DMRec);
      { Re-cache the info needed for the bezier. }
    var
      reals: array[1..3] of real;
      bezptr: BezStatePtr;
      listSize: longInt;
      nodeCount, counter1: integer;
      yawAdj, pitchAdj, rollAdj: integer;
      startNode, thisNode, nextNode, lastNode: PRecPtr;   {up, down, right: PRecPtr;}
      thisRot, nextRot, lastRot: RotTrip;
      lastLook: RotTrip;                          { lookAt values for lastNode -> thisNode }
      bezierlist: bezierPtr;
      h: Handle;

      startAltDelta, lastAltDelta, nextAltDelta: bezierPt;


    function FindNext (node: PRecPtr; goDown: Boolean): PRecPtr;
      var
        n: PRecPtr;
    begin
      if goDown then
        n := node^.down
      else
        n := node^.right;
      if n = nil then
        n := startNode;
      FindNext := n;
    end;

    procedure calcPosDelta (point1, point2: PrecPtr; var delta: bezierPt);
      var
        x: integer;
        zero: boolean;
    begin
{lastNode can be point2}
{nextnode can be point1}
      zero := false;
      if (lastNode = thisNode) and (lastNode = point2) then
        zero := true;
      if (nextNode = thisNode) and (nextNode = point1) then
        zero := true;

      if zero then
        for x := 1 to 3 do
          delta[x] := long2fix(0)
      else
```

```
    begin
      delta[1] := long2fix(point1^.gpt.x - point2^.gpt.x);
      delta[2] := long2fix(point1^.gpt.y - point2^.gpt.y);
      delta[3] := long2fix(point1^.gpt.z - point2^.gpt.z);
    end
  end;

  procedure calcRotDelta (var tr1, tr2: RotTrip; var delta: bezierPt);
     { Rotations are a special case because of two reasons. }
     { 1. The axis to rotate might be calculated from looking at the tangent at this point or from the points
      rotation. }
     { 2. To keep the slope linear when going through 0° crossings a +-360° adjustment factor is kept. }
   var
     x: integer;
     zero: boolean;
  begin
   zero := false;
   if (lastNode = thisNode) and (@lastRot = @tr2) then
     zero := true;
   if (nextNode = thisNode) and (@nextRot = @tr1) then
     zero := true;

   if zero then
     for x := 1 to 3 do
       delta[x] := long2fix(0)
   else
     begin
       delta[1] := long2fix(tr1.yaw - tr2.yaw);
       delta[2] := long2fix(tr1.pitch - tr2.pitch);
       delta[3] := long2fix(tr1.roll - tr2.roll);
     end;
  end;

  procedure CheckAdj (thisAng, nextAng: integer; var angAdj: integer);
            { If the acute angle between thisAng and nextAng goes through 0° then }
            { adjust angAdj by +-3600° so we can still treat angles as linear. }
  begin
   thisAng := DegRange(thisAng);
   nextAng := DegRange(nextAng);
   if abs(thisAng - nextAng) > 1800 then
     if thisAng > nextAng then
       angAdj := angAdj + 3600
     else
       angAdj := angAdj - 3600;
  end;

  procedure CalcBezPt (listIndex: integer; doPos, firstPt: Boolean);
         { Calc the bezier info for thisNode based on lastNode and nextNode. }
         { Fill the appropriate elements in the bezierList. }
   var
     counter2: integer;
     startStopDelta, lastThisDelta, thisNextDelta: bezierPt;
     nextHype, lastHype, tempHypeScale: real;
```

```
begin
      {stuff values into the points in the arrays of fixeds}
  if doPos then
    begin
      bezierlist^[listIndex, 1, 1] := long2fix(thisNode^.gPt.x);
      bezierlist^[listIndex, 1, 2] := long2fix(thisNode^.gPt.y);
      bezierlist^[listIndex, 1, 3] := long2fix(thisNode^.gPt.z);
      calcPosDelta(nextNode, lastNode, startStopDelta);
      calcPosDelta(thisNode, lastNode, lastThisDelta);
      calcPosDelta(nextNode, thisNode, thisNextDelta);
    end
  else
    with thisRot do
      begin
        bezierlist^[listIndex, 1, 1] := long2fix(yaw);
        bezierlist^[listIndex, 1, 2] := long2fix(pitch);
        bezierlist^[listIndex, 1, 3] := long2fix(roll);
        calcRotDelta(nextRot, lastRot, startStopDelta);
        calcRotDelta(thisRot, lastRot, lastThisDelta);
        calcRotDelta(nextRot, thisRot, thisNextDelta);
      end;

  for counter2 := 1 to 3 do
    reals[counter2] := fix2x(fixMul(thisNextDelta[counter2], thisNextDelta[counter2]));
  nextHype := sqrt(reals[1] + reals[2] + reals[3]);

  for counter2 := 1 to 3 do
    reals[counter2] := fix2x(fixMul(lastThisDelta[counter2], lastThisDelta[counter2]));
  lastHype := sqrt(reals[1] + reals[2] + reals[3]);

  if lastHype + nextHype <> 0 then
    tempHypeScale := (lastHype / (lastHype + nextHype)) / 3
  else
    tempHypeScale := 0;

  if (not firstPt) then
    for counter2 := 1 to 3 do
      bezierlist^[listIndex - 1, 3, counter2] := bezierlist^[listIndex, 1, counter2] -
     fixMul(startStopDelta[counter2], X2Fix(tempHypeScale));

  if lastHype + nextHype <> 0 then
    tempHypeScale := (nextHype / (lastHype + nextHype)) / 3
  else
    tempHypeScale := 0;

  if (nextNode <> nil) and (nextNode <> thisNode) then
    for counter2 := 1 to 3 do
      bezierlist^[listIndex, 2, counter2] := bezierlist^[listIndex, 1, counter2] +
     fixMul(startStopDelta[counter2], X2Fix(tempHypeScale));
end;

function CalcLookFrom (lookfrm: PRecPtr): RotTrip;
```

```
        { Calc the roll,pitch,yaw needed to look from this point to the next in the list. }
        { in local coordinates for the point this is being moved by this bezier dm. }
  var
    tp: PointRec;
  begin
    with bezptr^ do
      begin
        tp := dm.pointsOut[0].ptrto^;
        tp.gPt := lookfrm^.gPt;
        unConvert(@tp);
        tp.dirty := true;
        calcLookAt(@tp, FindNext(lookfrm, bezptr^.goDown), axis, not posAxis);
        CalcLookFrom := tp.lSix.tt;
      end;
  end;

  function CalcNextTangent: RotTrip;
        { Calculate the tangent for the nextNode.  thisNode is one back from nextNode. }
    var
      rt, rt1: RotTrip;
    function DegAverage (d1, d2: integer): integer;
      var
        adj: integer;
    begin
      if abs(d1 - d2) > 1800 then
        DegAverage := DegRange((d1 + d2 + 3600) div 2)
      else
        DegAverage := DegRange((d1 + d2) div 2);
    end;

  begin
    rt := calcLookFrom(nextNode);
    rt1.yaw := DegAverage(lastLook.yaw, rt.yaw);
    rt1.pitch := DegAverage(lastLook.pitch, rt.pitch);
    rt1.roll := DegAverage(lastLook.roll, rt.roll);
    lastLook := rt;
    CalcNextTangent := rt1;
  end;

begin     { reHookBezier }
  if sizeof(BezierState) > sizeof(dm.privateWords) then
    AnnounceB('ERROR: BezierState > it can be.');
  if dm.state <> on then
    exit(reHookBezier);

  bezptr := BezStatePtr(@dm.privateWords);
  if (dm.private <> nil) then        {get rid of the old array of points}
    disposPvt(dm.private);

  startNode := pRecPtr(dm.slotsIn[0].ptrFrm);

  nodeCount := 0;
  thisNode := startNode;
```

```
while (thisNode <> nil) do
  begin      { Count the number of nodes in this list. }
    DirtyConvert(thisNode);
    nodeCount := nodeCount + 1;
    lastNode := thisNode;
    if bezptr^.goDown then
      thisNode := thisNode^.down
    else
      thisNode := thisNode^.right;
  end;
listSize := nodeCount + 1;
if bezptr^.rotate <> NoRot then
  listSize := listSize + nodeCount + 1;

dm.private := NewPvt(listSize * sizeof(bezierStation));
if dm.private = nil then
  begin
    AnnounceB(StringOf('Allocating memory for Bezier path "', dm.name, '" failed.  DM off.'));
    dm.state := off;
    dm.private := nil;
    exit(reHookBezier);
  end;
bezierlist := bezierPtr(dm.private);

if bezptr^.rotate = PointRot then
  begin
    thisRot := startNode^.lSix.tt;
    lastRot := startNode^.lSix.tt;
  end
else if bezptr^.rotate = Tangent then
  begin
    if bezptr^.endBehave = endLoop then
      begin
        lastLook := CalcLookFrom(lastNode);
        lastRot := lastLook;
        nextNode := startNode;
        thisRot := CalcNextTangent;
        lastLook := CalcLookFrom(startNode);
      end
    else
      begin
        lastLook := CalcLookFrom(startNode);
        thisRot := lastLook;
        lastRot := lastLook;
      end;
  end;

yawAdj := 0;
pitchAdj := 0;
rollAdj := 0;
thisNode := startNode;
lastNode := thisNode;
for counter1 := 1 to nodeCount + 1 do
```

```
if (thisNode <> nil) then
  begin
    nextNode := FindNext(thisNode, bezptr^.goDown);

    if counter1 = nodeCount then            { if at the last node }
      if bezptr^.endBehave = endloop then      { if looping calc the curve to the first node. }
        nextNode := startNode
      else
        nextNode := thisNode;               { else calc curve to end cleanly. }

    if nextNode = nil then
      nextNode := thisNode;

    CalcBezPt(counter1, true, (counter1 = 1));     { do the calculations for position. }

    if bezptr^.rotate <> NoRot then
      begin                         { if rotate then do calc's for rotations. }
        if bezptr^.rotate = PointRot then
          nextRot := nextNode^.lSix.tt
        else
          nextRot := CalcNextTangent;
        if (nextNode <> thisNode) then
          with nextRot do
            begin                          { If any angles transit across 0° then }
              CheckAdj(thisRot.yaw, yaw, yawAdj);       { adjust so the equation is still linear. }
              CheckAdj(thisRot.pitch, pitch, pitchAdj);
              CheckAdj(thisRot.roll, roll, rollAdj);
              yaw := yaw + yawAdj;                          { Apply adjustments to nextNode.
}
              pitch := pitch + pitchAdj;
              roll := roll + rollAdj;
            end;
        CalcBezPt(counter1 + (nodeCount + 1), false, (counter1 = 1));        { do calculations for
rotation. }
      end;

    lastNode := thisNode;
    thisNode := nextNode;
    lastRot := thisRot;
    thisRot := nextRot;
  end;

bezptr^.nodePosition := 0;
bezptr^.stepPosition := 1;
bezptr^.nodeCount := nodeCount;
bezptr^.isGoing := false;
bezptr^.crntDir := 1;
with dm.pointsOut[0] do
  begin   { Reset the point to the start of the path. }
    ptrto^.gPt := startNode^.gPt;
    unconvert(ptrto);
    SetSixth(ptrto, 3, fRound(bezierlist^[1 + (nodeCount + 1), 1, 1]));
    SetSixth(ptrto, 4, fRound(bezierlist^[1 + (nodeCount + 1), 1, 2]));
```

```
    SetSixth(ptrto, 5, fRound(bezierlist^[1 + (nodeCount + 1), 1, 3]));
  end;
end;   { reHookBezier }

procedure load_code_res;      {(id: integer): ptr}
 var
   res_Err: integer;
   res_Ref_Num: integer;
   code_handle: handle;
   code_ptr: ptr;
begin
  code_handle := GetResource('CODE', bezierCodeID);
  MoveHHi(code_handle);
  Hlock(code_handle);
  res_err := ResError;
  bezierCodePtr := code_handle^;
end;

procedure doBezier (var dm: dmrec);
 var
   x, y, z, time: fixed;
   yp, pp, rp: fixed;
   tempPtr: bezierPtPtr;
   count, count3: integer;
   steps: integer;
   go: boolean;
   bezptr: BezStatePtr;
   startNode: PRecPtr;

  function bezier_curve (array1: ptr; time: fixed; proc: ptr): fixed;
  inline
    $205F, { move.l  (a7)+,a0  }
    $4E90; { jsr     (a0)      }

 begin
  startNode := pRecPtr(dm.slotsIn[0].ptrFrm);
  if startNode^.dirty then
    reHookBezier(dm);

  bezptr := BezStatePtr(@dm.privateWords);
  go := false;
  steps := dm.slotsIn[1].ptrfrm^.i;

  if (bezptr^.isGoing) and (bezptr^.stepPosition < (steps - 1)) then   {already going and not at node}
    go := true
  else if (bezptr^.stepPosition = (steps - 1)) and (dm.slotsIn[2].ptrfrm^.i <> 0) then   {at node and input}
    go := true
  else if (not bezptr^.isGoing) and (dm.slotsIn[2].ptrfrm^.i <> 0) then   {stopped and input}
    begin
      go := true;
      bezptr^.stepPosition := 1;
    end;
```

```
bezptr^.isGoing := go;        { bezptr^.isGoing is whether this is going or not. }

    { Don't go at all if input #4 is false. }
if (dm.slotsin[3].ptrfrm^.i = 0) or not bezptr^.isGoing then
  begin
    dm.pointsOut[1].lastValue.i := ord(false);
  end
else
  with bezptr^ do
    begin
      if endBehave <> endReverse then
        begin
          if dm.SlotsIn[3].ptrfrm^.i > 0 then
            crntDir := 1
          else if dm.SlotsIn[3].ptrfrm^.i < 0 then
            crntDir := -1;
        end;
      dm.pointsOut[1].lastValue.i := ord(isGoing);          { Output #2 is going or not. }
      dm.pointsOut[2].lastValue.i := nodePosition + 1;      { Output #3 is current node position. }
      lastChange := dm.SlotsIn[3].ptrfrm^.i;

      stepPosition := stepPosition + crntDir;

      if stepPosition = steps then
        begin
          stepPosition := 1;
          nodePosition := nodePosition + 1;    {change node position}

          if nodePosition >= (nodeCount - 1) then
            begin
              case endBehave of
                endLoop:
                  if nodePosition > (nodeCount - 1) then
                    nodePosition := 0;
                endStop, endAgain:
                  nodePosition := 0;
                endReverse:
                  begin
                    crntDir := -1;
                    nodePosition := nodeCount - 2;
                    stepPosition := steps - 1;
                  end;
              end;
            end;
        end
      else if stepPosition < 1 then
        begin
          stepPosition := steps - 1;
          nodePosition := nodePosition - 1;    {change node position}

          if nodePosition < 0 then
            begin
              case endBehave of
```

```
              endLoop:
                nodePosition := nodeCount - 1;
              endStop, endAgain:
                nodePosition := nodeCount - 2;
              endReverse:
                begin
                  crntDir := 1;
                  nodePosition := 0;
                  stepPosition := 1;
                end;
            end;
          end;
      end;

    time := fixRatio(stepPosition, steps);

    if dm.pointsOut[0].ptrto <> nil then
      with dm.pointsOut[0] do
        begin
          tempPtr := bezierPtPtr(ord4(dm.private) + nodePosition * sizeof(bezierStation));
          x := bezier_curve(@tempPtr^[1], time, bezierCodePtr);
          y := bezier_curve(@tempPtr^[2], time, bezierCodePtr);
          z := bezier_curve(@tempPtr^[3], time, bezierCodePtr);

          ptrto^.gPt.x := fRound(x);
          ptrto^.gPt.y := fRound(y);
          ptrto^.gPt.z := fRound(z);
          unconvert(ptrto);
          for count3 := 0 to 2 do
            SetSixth(ptrto, count3, ptrto^.lSix.s[count3]);

          if rotate <> NoRot then
            begin
              tempPtr := bezierPtPtr(ord4(dm.private) + (nodePosition + nodeCount + 1) *
    sizeof(bezierStation));
              yp := bezier_curve(@tempPtr^[1], time, bezierCodePtr);
              pp := bezier_curve(@tempPtr^[2], time, bezierCodePtr);
              rp := bezier_curve(@tempPtr^[3], time, bezierCodePtr);
              SetSixth(ptrto, 3, fRound(yp));
              SetSixth(ptrto, 4, fRound(pp));
              SetSixth(ptrto, 5, fRound(rp));
            end;
        end;
    end;
end;


procedure HandleBezier; { (v : DMVerb; var dm : DMRec) }
  var
    i: integer;

  procedure CheckBezInfo;
    { Check to make sure this is a new bezier dm.  If it is an old one fill out the default config values. }
```

000067

```
  var
    bezptr: BezStatePtr;
begin
  bezptr := BezStatePtr(@dm.privateWords);
  if dm.version = 0 then
    with bezptr^ do
      begin
        goDown := true;
        rotate := Tangent;
        axis := doZ;
        posAxis := true;
        endBehave := endLoop;
        dm.version := 1;
      end;
end;

procedure Calibrate;
    { Calibrate/ configure this bezier dm. }
  const
    modalID = 2043;
    RightItem = 5;
    DownItem = 6;
    noRotItem = 7;
    TangentItem = 9;
    StartBehaveItem = 12;
    EndBehaveItem = 15;
    XaxisItem = 16;
    ZaxisItem = 18;
    PosAxisItem = 19;
  var
    bezptr: BezStatePtr;
    dlog: DialogPtr;
    itemHit: integer;
    oldPort: GrafPtr;
    temp: BezierState;
begin
  ParamText(dm.name, '', '', '');

  bezptr := BezStatePtr(@dm.privateWords);
  temp := bezptr^;
  GetPort(oldPort);
  dlog := GetNewDialog(modalID, nil, Pointer(-1));
  SetPort(dlog);
  RadioRange(dlog, RightItem, 2, ord(temp.goDown));
  RadioRange(dlog, noRotItem, TangentItem - noRotItem + 1, ord(temp.rotate));
  RadioRange(dlog, XaxisItem, 3, ord(temp.axis));
  RadioRange(dlog, StartBehaveItem, ord(EndReverse) + 1, ord(temp.endBehave));
  RadioOn(dlog, PosAxisItem, temp.posAxis);

  repeat
    ModalDialog(nil, itemHit);
    case itemHit of
      RightItem, DownItem:
```

```
          begin
            temp.goDown := (itemHit = DownItem);
            RadioRange(dlog, RightItem, 2, ord(temp.goDown));
          end;
        noRotItem..TangentItem:
          begin
            temp.rotate := RotType(itemHit - noRotItem);
            RadioRange(dlog, noRotItem, TangentItem - noRotItem + 1, ord(temp.rotate));
          end;
        XaxisItem..ZaxisItem:
          begin
            temp.axis := WhichAxis(itemHit - XaxisItem);
            RadioRange(dlog, XaxisItem, 3, ord(temp.axis));
          end;
        PosAxisItem:
          begin
            temp.posAxis := not temp.posAxis;
            RadioOn(dlog, PosAxisItem, temp.posAxis);
          end;
        StartBehaveItem..EndBehaveItem:
          begin
            temp.endBehave := EndBehaviorType(itemHit - StartBehaveItem);
            RadioRange(dlog, StartBehaveItem, ord(EndReverse) + 1, ord(temp.endBehave));
          end;
      end;      { case }
    until itemHit <= 2;  { Until OK or Cancel is clicked. }
    if itemHit = 1 then
      begin { OK clicked. }
        bezptr^ := temp;
      end;
    DisposDialog(dlog);
    SetPort(oldPort);
  end;

begin
  case v of
    initDM:           { Called once the first time this DM is started. }
      begin
        doClose(dm);
        CheckBezInfo;
        Calibrate;
      end;
    massageDM:        { Called once through the main loop.  do a massage }
      begin
        doBezier(dm);      { This shouldn't actually be called, doPass is called directly. }
      end;
    closeDM:                      { Called at the end of the program run.  Do whatever... }
      doClose(dm);
    reHookedDM:
      rehookBezier(dm);
    fopenDM:
      begin
        CheckBezInfo;
```

```
        if dm.state = on then
          rehookBezier(dm);           { This DM has just been read from a file.  If it's state is }
                  { on it was hooked up properly.  private points to the }
        { private memory it had when saved. }
      end;
    fsaveDM:
      DisposPvt(dm.private);
    calibDM:
      begin
        Calibrate;
        rehookBezier(dm);                    { Calibrate the DM module. }
      end;
    CalibPartDM:
      rehookBezier(dm);
    otherwise
      GenericHandle(v, dm);
  end;        { case }
end;          { HandleBezier }

end.
```

07/17/89 18:06 bezier_types.pas Page 1

```
unit bezier_types;

interface

  const
    bezier_code_id = 6000;

  type

    point3ex = record
        x, y, z: real;
      end;
    point3 = record
        x, y, z: fixed;
      end;
    point3_array = array[1..4, 1..3] of point3;
    point3_array_ptr = ^point3_array;

  var
    code_ptr: ProcPtr;
    point_array: point3_array_ptr;
    actual_points: point3_array_ptr;

implementation
end.
```

```
unit bezier_utils;
interface
  uses
    bezier_types;

  function load_code_res (id: integer): ptr;
  procedure calcDelta (point1, point2: point3; var delta: point3);
  procedure GetNextLast (num: integer; var next, last: point3);


  function bezier_curve (array1: ptr; time: fixed; proc: ptr): fixed;
  inline
    $205F,   { move.l  (a7)+,a0 }
    $4E90;   { jsr     (a0)     }


implementation

  function load_code_res;      {(id: integer): ptr}
    var
      res_Err: integer;
      res_Ref_Num: integer;
      code_handle: handle;
      code_ptr: ptr;
  begin
    res_Ref_Num := openResFile('beziercode');
    res_Err := resError;

    writeln(stringof('open error ', res_Ref_Num, ' res error ', res_err));
    code_handle := GetResource('CODE', id);
    Hlock(code_handle);
{    code_ptr := code_handle^; }
    res_err := ResError;
    if res_err <> 0 then
      writeLn(stringof('get code error ', res_err));
    load_code_res := code_handle^;
  end;

  procedure calcDelta;     {(point1, point2: point3; var delta: point3);}
  begin
    delta.x := (point1.x - point2.x);
    delta.y := (point1.y - point2.y);
    delta.z := (point1.z - point2.z);
  end;

  procedure GetNextLast (num: integer; var next, last: point3);
  begin
    if (num - 1) < 1 then
      last := point_array^[num, 1]
    else
      last := point_array^[num - 1, 1];

    if (num + 1) > 4 then
```

07/17/89 17:18 bezier_utils.pas Page 2

```
      next := point_array^[num, 1]
    else
      next := point_array^[num + 1, 1];
  end;
end.
```

```
{ This is a colection of DA's made by chuck.  They are mostly here so he can }
{ test out the rest of the code without having to have any I/O hooked up. }

unit ChucksDAs;
interface
  uses
    ChuckStuff, Globals, RawUnit;

  var
    cycleDAR, timeDAR: DARec;
    LastKey: integer;                    { Last key typed in the keyboard. }

  function RawInc: integer;        { Return the current value of the raw 'Inc'. }

  function CycleDA (v: DAverb; var dar: DARec): integer;
  function TimeDA (v: DAverb; var dar: DARec): integer;

implementation
  type
    CycleRec = record
        direc: integer;
      end;
    CycleRecPtr = ^CycleRec;

    lotsaInts = array[0..100] of integer;
    intsPtr = ^lotsaInts;

  function RawInc: integer;        { Return the current value of the raw 'Inc'. }
    var
      ip: intsPtr;
  begin
    ip := Pointer(CycleDAR.ptrto);
    RawInc := ip^[2];
  end;

{ This is a test Data Acquisition module.  It just cycles one integer from -90 to +90 }
  function CycleDA; {  (v : DAverb; var dar : DARec) : integer }

    var
      pp: CycleRecPtr;
      ip: intsPtr;
      ptPtr: ^Point;
      i: integer;
  begin
    CycleDA := 0;
    case v of
      initDA:
        begin
          dar.Private := NewPtr(sizeof(CycleRec));
          dar.name := 'Cycler';
          dar.Size := 10;
          dar.FirstSlot := AllocateRaw(dar.name, dar.Size);
          if dar.FirstSlot <> -1 then
```

```
        begin
          dar.ptrto := @RawData[dar.FirstSlot];
          pp := Pointer(dar.Private);
          pp^.direc := 5;
          rawDataDef[dar.FirstSlot + 1].name := 'Rotate';
          rawDataDef[dar.FirstSlot + 2].name := 'inc';
          rawDataDef[dar.FirstSlot + 3].name := 'MouseY';
          rawDataDef[dar.FirstSlot + 4].name := 'MouseX';
          rawDataDef[dar.FirstSlot + 5].name := 'KeyBoard';
          rawDataDef[dar.FirstSlot + 6].name := 'MouseButton';
          rawDataDef[dar.FirstSlot + 7].name := 'OutputCounter';
          rawDataDef[dar.FirstSlot + 8].name := 'True';
          rawDataDef[dar.FirstSlot + 9].name := 'False';
          LastKey := 0;
          ip := Pointer(dar.ptrto);
          for i := 0 to dar.Size - 1 do
            ip^[i] := 0;
          ip^[dar.Size - 2] := 1;
          OutCountPtr := @ip^[7];       { OutCountPtr points to the int to inc for output counters. }
        end
      else
        CycleDA := -1;
    end;
  ReadDA:
    with dar do
      begin
        pp := CycleRecPtr(dar.private);
        i := ptrto^;
        if (i <= -90) or (i >= 90) then
          pp^.direc := pp^.direc * (-1);
        ptrto^ := i + pp^.direc;
        ip := Pointer(ptrto);
        ip^[1] := ip^[1] + 20;
        if ip^[1] > 3590 then
          ip^[1] := 0;
        ip^[2] := ip^[2] + 1;
        ptPtr := @ip^[3];
        if true then
          begin
            GetMouse(ptPtr^);
            LocaltoGlobal(ptPtr^);
          end;
        ip^[5] := LastKey;
        if Button then
          ip^[6] := 1
        else
          ip^[6] := 0;
        LastKey := 0;
      end;
  resetDA:
    begin
      ip := Pointer(dar.ptrto);
      for i := 0 to dar.Size - 1 do
```

```
        ip^[i] := 0;
       ip^[dar.Size - 2] := 1;
     end;
    closeDA:
     DisposPtr(Ptr(dar.private));
    otherwise
     ;
   end;      { Case }
  end;    { CycleDA }

{ Sets up slots for jiffys, seconds, minutes and hours. }
 function TimeDA; { (v : DAverb; var dar : DARec) : integer }

   var
    pp: CycleRecPtr;
    i: integer;
    ip: IntsPtr;
    date: DateTimeRec;
 begin
   TimeDA := 0;
   case v of
    initDA:
     begin
      dar.Private := nil;
      dar.name := 'SyncJiffy';
      dar.Size := 4;
      dar.FirstSlot := AllocateRaw(dar.name, dar.Size);
      if dar.FirstSlot <> -1 then
       begin
        dar.ptrto := @RawData[dar.FirstSlot];
        rawDataDef[dar.FirstSlot + 1].name := 'Seconds';
        rawDataDef[dar.FirstSlot + 2].name := 'Minutes';
        rawDataDef[dar.FirstSlot + 3].name := 'Hours';
       end
      else
       TimeDA := -1;
     end;
    ReadDA:
     with dar do
      begin
       ip := Pointer(dar.ptrto);
       ip^[0] := BitAnd(rawTick, $FFFF);
       GetTime(date);
       ip^[1] := date.second;
       ip^[2] := date.minute;
       ip^[3] := date.hour;
      end;
    resetDA:
     dar.ptrto^ := 0;
    otherwise
     ;
   end;      { Case }
  end;    { TimeDA }
```

```
end.
```

```
{  ChuckStuff.pas - Chuck Blanchard 6/22/86 ver 0.0}
{  ver 0.1  3/3/87  }
{  added MyGet1Resource and AddPtrResource.     CLB   7/18/87 }

{  This is a collection of stand alone procedures I frequently use.}
{  There are no global variables.}

unit ChuckStuff;

interface


{ Return true if the option key is down at this moment. }
  function OptionIsDown: boolean;
  function CapsLockIsDown: boolean;

{ Enable or disable the given menu item. }
  procedure EnDisItem (mh: MenuHandle; item: Integer; OnOff: boolean);

{ Return true if this window is currently visible }
  function WindowOn (wptr: windowPtr): boolean;

  procedure OldFileIdent (var Name: str255; var vRef: integer; prompt: str255; Tnum: integer; TList:
       SFTypeList);
  procedure OldFileIdent2 (var Name: str255; var vRef: integer; prompt: str255; Tnum: integer; TList:
       SFTypeList);
  procedure NewFileIdent (var Name: str255; var vRef: integer; origName, prompt: str255);

  procedure SetDlgText (dPtr: DialogPtr; ItemType, item: integer; text: str255);
  procedure GetDlgText (dPtr: DialogPtr; ItemType, item: integer; var text: str255);

  procedure SetEdText (dPtr: DialogPtr; item: integer; text: str255);
  procedure GetEdText (dPtr: DialogPtr; item: integer; var text: str255);

{ if marked is true then Mark the menu item with the markChar, otherwise }
{ clear any mark. }
  procedure MarkItem (theMenu: MenuHandle; item: integer; markChar: char; marked: boolean);

  procedure ShowHideControl (c: ControlHandle; show: boolean);

{ same as the procedure NumtoString but a function }
  function ntos (n: longint): str255;
  function StringtoInt (str: Str255): integer;

{ Return true if this is running under LightSpeed Pascal. }
  function inLSP: boolean;

  function dragRect (strtPt: point): Rect;    { drag a rectangle around. }
  procedure RadioOn (dlogPtr: DialogPtr; itemNo: integer; State: boolean);
  procedure RadioRange (dlogPtr: DialogPtr; first, num, hit: integer);
  procedure EnDisDItem (dlogptr: DialogPtr;{ Enable/Disable a dialog item. }
              item: integer; enable: boolean);
```

```
{ Same as Get1Resource in the new ROMS }
 function myGet1Resource (theType: ResType; theID: integer): Handle;

{ Add a copy of theData as a new resource to the current resource file.  If the }
{ resource type/id already exists, delete it first. }
 procedure AddPtrResource (theData: ptr; size: longint; theType: ResType; theId: integer; theName:
       Str255);

 procedure SaveWindState (wp: WindowPtr; resID: integer);        { save window state in WIND resource
       }
 function CheckOnScreen (wp: WindowPtr): boolean;                 { make sure window is on screen }
 procedure PositionWindow (wp: WindowPtr; hPos, vPos: integer); { position window on screen }

 function NumtoHex (l: LongInt; digits: integer): string;
 function HextoNum (str: string): LongInt;

implementation

 function OptionIsDown; {: boolean}
  const
   OptionIndex = 58;
  var   { Return true if the option key is currently held down. }
   keys: KeyMap;
   bool: Boolean;
   Event: EventRecord;
 begin
{•  GetKeys(keys);•}
{• .OptionIsDown := BitTst(@keys, OptionIndex);•}
  bool := GetNextEvent(0, Event);
  OptionIsDown := (BitAnd(Event.modifiers, optionKey) = optionKey);
 end;

 function CapsLockIsDown; {: boolean}
  const
   CapsLockIndex = 57;
  var   { Return true if the option key is currently held down. }
   keys: KeyMap;
   bool: Boolean;
   Event: EventRecord;
 begin
{•  GetKeys(keys);•}
{•  CapsLockIsDown := BitTst(@keys, CapsLockIndex);•}
  bool := GetNextEvent(0, Event);
  CapsLockIsDown := (BitAnd(Event.modifiers, alphaLock) = alphaLock);
 end;

 procedure EnDisItem;
 begin                                                    { Enable or Disable a menu Item. }
  if OnOff then
   EnableItem(mh, item)
  else
   DisableItem(mh, item);
```

```
end; { EnDisItem }

function WindowOn;
  var                                       { Return true if the given window is currently on. }
    wp: windowpeek;
begin
  wp := pointer(wptr);
  if wp^.visible then
    WindowOn := true
  else
    WindowOn := false;
end;

procedure OldFileIdent;
  var                                       { Get the name of an existing file from the user. }
    reply: SFReply;
    where: point;
begin
  where.h := 50;
  where.v := 100;
  SFGetFile(where, prompt, nil, Tnum, Tlist, nil, reply);
  if reply.good then
    begin
      Name := reply.fName;
      vRef := reply.vRefNum;
    end
  else
    Name := '';
end; { OldFileIdent }
procedure OldFileIdent2 (var Name: str255; var vRef: integer; prompt: str255; Tnum: integer; TList:
      SFTypeList);
    { Get the name of an existing file from the user. }
  const
    SFGetPromptID = 1800;
  var
    reply: SFReply;
    where, where2: point;
    dlogPtr: DialogPtr;
    oldPort: GrafPtr;
begin
  GetPort(oldPort);
  ParamText(prompt, '', '', '');
  dlogPtr := GetNewDialog(SFGetPromptID, nil, Pointer(-1));
  PositionWindow(dlogPtr, 50, 7);
  ShowWindow(dlogPtr);
  DrawDialog(dlogPtr);
  SetPort(dlogPtr);
  where := dlogPtr^.portRect.topLeft;
  LocaltoGlobal(where);
  where2 := dlogPtr^.portRect.botRight;
  LocaltoGlobal(where2);
  where.v := where2.v + 20;
  SFGetFile(where, prompt, nil, Tnum, Tlist, nil, reply);
```

```
   if reply.good then
     begin
       Name := reply.fName;
       vRef := reply.vRefNum;
     end
   else
     Name := '';
   DisposDialog(dlogPtr);
   SetPort(oldPort);
 end;{ OldFileIdent2 }

 procedure NewFileIdent;
   var                                        { Get the name of a new file from the user. }
     reply: SFReply;
     where: point;
 begin
   where.h := 50;
   where.v := 100;
   SFPutFile(where, prompt, origName, nil, reply);
   if reply.good then
     begin
       Name := reply.fName;
       vRef := reply.vRefNum;
     end
   else
     Name := '';
 end;{ NewFileIdent }

 procedure SetDlgText; { (dPtr : DialogPtr; }
                         { ItemType, item : integer; }
                         { text : str255); }
{ Set the ednum'th edit item in the given dialog to the given text. }
   var
     ItemH: Handle;
     box: Rect;
     i, j, rtype: Integer;
 begin
   i := 1;
   j := 0;
   repeat
     GetDItem(dPtr, i, rtype, ItemH, box);
     i := i + 1;
     if rtype = ItemType then
       j := j + 1;
   until (j = item) or (ItemH = nil);
   if ItemH <> nil then
     SetIText(ItemH, text);
 end;

 procedure GetDlgText; { (dPtr : DialogPtr; }
                         { ItemType, item : integer; }
                         { var text : str255); }
{ Get the ednum'th edit item in the given dialog to the given text. }
```

```
  var
    ItemH: Handle;
    box: Rect;
    i, j, rtype: Integer;
 begin
  i := 1;
  j := 0;
  repeat
    GetDItem(dPtr, i, rtype, ItemH, box);
    i := i + 1;
    if rtype = ItemType then
      j := j + 1;
  until (j = item) or (ItemH = nil);
  if ItemH <> nil then
    GetIText(ItemH, text)
  else
    text := '';
 end;

 procedure GetEdText;
 begin
  GetDlgText(dPtr, editText, item, text);
 end;

 procedure SetEdText;
 begin
  SetDlgText(dPtr, editText, item, text);
 end;

{ If marked is true then mark the item with the char else unmark the item. }
 procedure MarkItem;
{ (theMenu : MenuHandle; item : integer; markChar : char; marked : boolean); }
 begin
  if marked then
    SetItemMark(theMenu, item, markChar)
  else
    SetItemMark(theMenu, item, chr(noMark));
 end;

 procedure ShowHideControl; { (c : ControlHandle; show : boolean) }
 begin
  if show then
    ShowControl(c)
  else
    HideControl(c);
 end;

 function ntos; { (n : longint) : str255 }
  var
    str: str255;
 begin
  NumtoString(n, str);
  ntos := str;
```

```
end;

function StringtoInt (str: Str255): integer;
  var
    l: LongInt;
begin
  StringtoNum(str, l);
  StringtoInt := l;
end;

function inLSP;
{ return true if this code is running from within LightSpeed Pascal. }
  const
    lspType = 'PJMM';
  var
    h: Handle;
begin
  h := GetResource(lspType, 0);
  inLSP := (h <> nil) and (ResError = 0);
  if h <> nil then
    ReleaseResource(h);
end;

function dragRect; {  (strtPt : point) : Rect }
{ Drag a rectangle around in the current grafport until the user lets up the mouse. }
{ Return the rectangle the user made. }
  var
    ps: PenState;
    pt, oldpt: point;
    dr: Rect;
begin
  GetPenState(ps);
  PenPat(gray);
  PenSize(1, 1);
  PenMode(patXor);
  oldpt := strtpt;
  dr.topleft := oldpt;
  dr.botRight := oldpt;
  while Stilldown do
    begin
      GetMouse(pt);
      if not equalPt(pt, oldpt) then
        begin
          oldpt := pt;
          FrameRect(dr);
          if pt.h < strtpt.h then
            dr.left := pt.h
          else
            dr.right := pt.h;
          if pt.v < strtpt.v then
            dr.top := pt.v
          else
            dr.bottom := pt.v;
```

```
        FrameRect(dr);
      end;
    end;
    FrameRect(dr);
    SetPenState(ps);
    dragRect := dr;
  end;

  procedure RadioOn; { (dlogPtr : DialogPtr; itemNo : integer }
                     { State : boolean); }
{ Turn the indicated dialog item on or off. }
    var
      Itype, onoff: integer;
      box: Rect;
      itemH: Handle;
      itemCH: ControlHandle;
  begin
    GetDItem(dlogPtr, itemNo, Itype, itemH, box);
    If State then
      onoff := 1
    else
      onoff := 0;
    itemCH := pointer(ItemH);
    SetCtlValue(itemCH, onoff);
  end; { ChangeButton }

  procedure RadioRange; { (dlogPtr : DialogPtr; first, num, hit : integer) }
{ Turn one button in the range first to last. }
    var
      i: integer;
  begin
    for i := first to first + num - 1 do
      RadioOn(dlogPtr, i, (i = (first + hit)));
  end;

  procedure EnDisDItem; {• (dlogptr : DialogPtr;•}
                        {•     item : integer;•}
                        {•   enable : boolean);•}
{ Enables/disables a dialog item. This assumes the item is in fact a control. }
    var
      j, hiliteState: integer;
      cH: ControlHandle;
      box: rect;
      itemH: Handle;
  begin
    If enable then
      hiliteState := 0
    else
      hiliteState := 255;
    GetDItem(dlogPtr, item, j, ItemH, box);
    cH := ControlHandle(itemH);
    HiliteControl(cH, hiliteState);
  end;
```

```
  function myGet1Resource; { (theType : ResType;theID : integer) : Handle; }
{ Same as Get1Resource in the new roms. }
   var
     h: Handle;
  begin
   h := GetResource(theType, theID);
   if HomeResFile(h) = CurResFile then
     myGet1Resource := h
   else
     myGet1Resource := nil;
  end;

  procedure AddPtrResource; {• (theData : ptr;•}
                              {•      size : longint;•}
                              {•      theType : ResType;•}
                              {•      theId : integer;•}
                              {•      theName : Str255);•}
{ Add the data pointed to by theData to the current resource file.  If a resource of }
{ this type/id already exists delete it.  }
   var
     h: Handle;
     p: Ptr;
  begin
   h := myGet1Resource(theType, theId);
   if h <> nil then
     begin
       RmveResource(h);
       DisposHandle(h);
     end;
   h := NewHandle(size);
   if h <> nil then
     begin
       BlockMove(theData, h^, size);
       AddResource(h, theType, theId, theName);
       WriteResource(h);
       ReleaseResource(h);
     end;
  end;

{ CheckOnScreen() - Check to make sure the given window is on the}
{    screen.  It won't be if it was moved way down or to the left on}
{    a mac II and then run on an SE.  Return true if the window was moved. }
{    Also check to see if the window is short enought to fit vertically on}
{    the screen.  Resize it if it isn't. }
  function CheckOnScreen; { (wp : WindowPtr) : boolean }
    var
      r: Rect;
      moveit: boolean;
      rHeight, sHeight: integer;
      MBarHeightPtr: ^integer;

  begin
```

T

```
    MBarHeightPtr := Pointer($BAA);
    moveit := false;
    r := wp^.portRect;
    { change r into global coords without using SetPort }
    OffsetRect(r, -(wp^.portBits.bounds.left), -(wp^.portBits.bounds.top));
    if (r.top < MBarHeightPtr^) then
      begin
        r.top := MBarHeightPtr^ + 5;
        moveit := true;
      end
    else if (r.top > screenBits.bounds.bottom - 5) then
      begin
        r.top := screenBits.bounds.bottom - 5;
        moveit := true;
      end;
    if (r.left < 0) then
      begin
        r.left := 5;
        moveit := true;
      end
    else if (r.left > screenBits.bounds.right - 50) then
      begin
        r.left := screenBits.bounds.right - 50;
        moveit := true;
      end;
    if (moveit) then
      MoveWindow(wp, r.left, r.top, false);
    rHeight := r.bottom - r.top;
    sHeight := screenBits.bounds.bottom - MBarHeightPtr^ - 20;
    if (rHeight > sHeight) then
      begin
        r.bottom := sHeight;
        SizeWindow(wp, r.right - r.left, sHeight, true);
        moveit := true;
      end;
    CheckOnScreen := moveit;
  end;

{ Save the state of the given window in a WIND resource. }
  procedure SaveWindState; {•(wp : WindowPtr;•}
                           {•     resID : integer);•}

    type
      WINDdef = record
          bounds: Rect;
          procId: integer;
          visible: boolean;
          goAwayFlag: boolean;
          refCon: longInt;
          title: string;
        end;
      WINDdefPtr = ^WINDdef;
```

```
    WStatePtr = ^WStateData;
    WStateHandle = ^WStatePtr;
  var
    h: Handle;
    wdp: WINDdefPtr;
    WStateH: WStateHandle;
    peek: WindowPeek;

begin
  h := myGet1Resource('WIND', resID);
  if (h <> nil) then
    begin
      HLock(h);
      wdp := WINDdefPtr(h^);
      wdp^.bounds := wp^.portRect;
      OffsetRect(wdp^.bounds, -(wp^.portBits.bounds.left), -(wp^.portBits.bounds.top));
      peek := WindowPeek(wp);
      if (peek^.windowKind = 8) and (peek^.spareFlag) then
        begin { zoomBox window }
          { if current window rect == stdState then the window is zoomed. }
          WStateH := WStateHandle(peek^.dataHandle);
          if (EqualRect(wdp^.bounds, WStateH^^.stdState)) then
            wdp^.bounds := WStateH^^.userState;
        end;
      wdp^.visible := peek^.visible;
      ChangedResource(h);
      WriteResource(h);
      HUnlock(h);
      ReleaseResource(h);
    end;
end;

procedure PositionWindow; { (wp: WindowPtr; hPos, vPos: integer) }
{ Position the given window on the screen. hPos and vPos are values from 0 to 100. }
{ These are the percentage of left/right or top/bottom you want the window positioned. }
{ 50,50 puts the window in the middle of the screen, 0,0 puts it in the upper left, 100,100 }
{ puts it in the lower right. In all cases a small border (2 pixels) is always left around }
{ the screen and the top of the screen is below the menu bar. }
  const
    border = 2;
  var
    top, left, hFree, vFree: integer;
    MBarHeightPtr: ^integer;

begin
  MBarHeightPtr := Pointer($BAA);
  if hPos < 0 then
    hPos := 0
  else if hPos > 100 then
    hPos := 100;
  if vPos < 0 then
    vPos := 0
  else if vPos > 100 then
```

```
    vPos := 100;

  with screenBits.bounds do
    begin
      { hFree and vFree are the number of pixels free after subtracting the size of the window. }
      hFree := (right - left) - (wp^.portRect.right - wp^.portRect.left) - border * 2;
      vFree := (bottom - top) - (wp^.portRect.bottom - wp^.portRect.top) - MBarHeightPtr^ - border * 2;
    end;
  left := round(hFree * (hPos / 100)) + border;
  top := round(vFree * (vPos / 100)) + MBarHeightPtr^ + border;
  MoveWindow(wp, left, top, false);
 end;

{ Return the hex string for this least siginificant digits of this long. }
 function NumtoHex; { (l: LongInt; digits: integer): string }
  var
    i, j: integer;
    str, hexstr: string;
 begin
  hexstr := '0123456789ABCDEF';
  if digits = 0 then
    begin
      str := '';
      repeat
        str := concat(hexstr[bitAnd(l, $F) + 1], str);
        l := bitShift(l, -4);
      until l = 0;
    end
  else
    begin
      str[0] := chr(digits);
      for i := (digits - 1) downto 0 do
        begin
          str[i + 1] := hexstr[bitAnd(l, $F) + 1];
          l := bitShift(l, -4);
        end;
    end;
  NumtoHex := str;
 end;

 function HextoNum (str: string): LongInt;
  var
    l: longInt;
 begin
  if length(str) > 8 then
    str[0] := chr(8)
  else
    while length(str) < 8 do
      str := concat('0', str);
  l := 0;
  StuffHex(@l, str);
  HextoNum := l;
 end;
```

```
end.
```

```
unit CompileTime;
interface

{ This file is here to be able to set global compile time variables. }
{ This is used instead of the Compiler Options or in globals for two reasons. }
{ 1. You can change a compiler directive and it won't cause the entire project to be built, just the files that
       use }
{      any of the directives here. }
{ 2. You can add comments that describe what the directives are and where they are used. }

{ For non-RB2 BE's set for_SGI = false, DataSwitch = false. }
{ For shippable BE with host communications set DoHost=true, BigSerBuff=true, EmulateHost=false. }
{ For shipment set Debug = false }

{ for_SGIs is the flag that includes the Isaac stuff or not. Used in various places thruout the project. If it's
       false the}
{ Isaac menu won't appear. }
{ Set DataSwitch true if you want to run both the DataSuit and the RB2 switch box switches. - CLB
       12/14/89 }
{ Used in macADIOSda.pas }

{ DoHost is true if you want to add host communications. To actually use them DoHost has to be true and the
       }
{ Host Communications box has to be checked in the DA configure dialog box. }
{ Used thruout the project but mostly in HostCom.pas. }

{ If DoHost is true then you can vary the code generated by the next two variables. }
{ If BigSerBuff is true then when the host is opened it sets it's serial buffer's to be larger than the usual 64
       bytes. }
{ This might cause problems when debugging because if you halt the program and the serial ports are still
       open the }
{ buffers will still be used, writing over that piece of memory. }
{ Set Emulate host to true if you want to be able to use one BE to test host communications on another. This
       adds the }
{ menu items under DA that allow you to test the host communication. }

{ When Debug is true you have access to some utilities and information not normally accessable by the
       normal user. }


{$setc for_SGIs = true }
{$setc DataSwitch = true and for_SGIs }
{$setc DoHost = true }
{$setc BigSerBuff = true }
{$setc EmulateHost = true }
{$setc Debug = true }

{$ifc not Option(MC68881) }
{ This is delibrately set up to generate a compile error if MC68881 is/is not checked. Thats because if you
       have }
{ MC68881 checked you have to use the SANELib6881.lib and if it isn't checked you have to use SANELib.lib.
       }
```

```
{ If you don't the code will compile fine but some SANE calls will return the wrong results.  In particular
        X2Fix() and }
{ Fix2X() are wrong so the numbers shown in the Scale/Offset dialog box are wrong.  If you change the
        MC68881 }
{ option change the sense of the '$ifc' conditional above by adding/deleting a 'not'.  That way whenever it is
        changed }
{ this compiler error will happen, reminding you to switch the library. }
  MC68881_Error;
{$endc }

implementation
end.
```

```
{   Code to handle the Convolvitron DM.  For this pass this DM takes 4 inputs. }
{ The first is the leading byte.  The next 3 are integers. }
{ When the DM is on it pumps 7 bytes out the specified serial port. }
{ In calibration you can specify port name and baud rate. }
{   © 1990 VPL Research Inc. }
{   3/20/90 Chuck Blanchard }


unit ConvolveDM;

interface

  uses
    Serial, ChuckStuff, AutoLib, FastStuff, Globals, Tree3DGlob, {}
    SerialTypes, SerialRoutines, MiscRoutines, DMTypes, DMGlobals;

  procedure doConvolve (var dm: DMRec);
  procedure HandleConvolve (v: DMVerb; var dm: DMRec);
  procedure InitConvolvers;

implementation

  const
    serBuffLen = 16;
    defaultBaud = baud19200 + stop20 + noParity + data8;
    defaultInterval = 2;
    CtronPosIdx = 0;          { Index into privateWords for tickcount interval. }
    channelIdx = 1;             {Index into privateWords for multi-channel stuff LEVITT}
    DisplayIdx = 2;           { Index into privateWords for Display Values boolean. }
    portIdx = 3;              { Index into privateWords for port num (1..16) }

    SyncWord = $8080;
    ConvolveDlogID = 2042; { Dialog box for Robot Convolve calibration. }
    DisplayItem = 8;          { Item # for Display Values check box. }
    popUpItemNo = 9;          { Item # for popup menu. }
    portNameItem = 10;        { Item # for the displayed port name. }

    LeadByteNum = 0;          { Number of leading bytes -1  (0..Num) }
    IntsNum = 2;            { Number of integers -1  (0..Num) }

    maxCTrons = 2; { max number of Convolver audio systems. LEVITT }
    maxCTchannels = 4;


  type
    intstype = array[0..32000] of integer;
    intsptr = ^intstype;

    { For now we are sending 7 bytes to the convolvitron.  Since records and ints are placed on word
        boundarys on the }
    { mac put an extra byte at the head of the record and then send the 7 bytes after the padded byte. }
```

```
  SendRecordType = packed record
     syncWord: integer;                     { header byte }
     ints: array[0..2] of  integer;       { 3 ints. }
    end;

  {a CTron represents a shared serial port maintaining several channels of Convolvotron information.
     LEVITT}

  CTron = record
     nactivechannels: integer;   {increment this when we create a new DM, decrement when we kill one.}
     maxchannels: integer;   {1, 2, or 4 in spring '90 design}
     convolvePort: integer;
     baudrate: integer;
     Interval: integer;
     LastTick: longint;
     whichbuffer: boolean;

     toConvolveRef,                 { file RefNum for the Convolve ouput channel. }
     frmConvolveRef: integer;       { file RefNum for the Convolve input channel. }
     toConvolvePB: ParamBlockRec;
     toFname, frmFname: string[20];
     serOutBuffA: packed array[0..serBuffLen] of integer;  {send out in blocks of 32 chars! LEVITT}
     serOutBuffB: packed array[0..serBuffLen] of integer;  {send out in blocks of 32 chars! LEVITT}
     ConvolveOn: boolean;
     ConvolveStatus: SerStaRec;
    end;

  CtronPtr = ^Ctron;

 const
  SendOffset = 0;                                          { offset 1 from the start of a sendRec }
  SendSize = sizeof(SendRecordType) - SendOffset;          { Sending 7 bytes }

 var
  SendRec, defaultSendRec, realSendRec: SendRecordType;        { Record to send. }

  DisplayValues: boolean;
  nCTrons: integer;  {for LEVITT multi-channel code}
  CTrons: array[0..maxCTrons] of CTron;

  doFlip: boolean;              { True if word bytes should be flipped. }

{ Fill the sendrec with default values. }
 procedure SetDefault;
  var
   i: integer;
 begin
  with SendRec do
   begin
    syncWord := 0;
    for i := 0 to IntsNum do
     ints[i] := 0;
   end;
```

```
    defaultSendRec := SendRec;
  end;

{-----------------------------------------}
  procedure InitCtron (var Ct: Ctron; portnum: integer);
  begin
    with Ct do
      begin
        nactivechannels := 0;
        maxchannels := 4;
        convolveport := portnum;
        baudrate := defaultbaud;
        interval := defaultinterval;

        LastTick := 0;
        whichbuffer := true;
      end;
  end;
{-----------------------------------------}
  procedure InitConvolvers;
  begin
    InitCtron(Ctrons[0], portl);
    InitCtron(Ctrons[1], portJ);
  end;
{-----------------------------------------}
  procedure OpenCtron (var Ct: Ctron);
    var
      i, err: integer;
      portCh: char;
      handshake: SerShk;
  begin
    with Ct do
      begin
        DisablePort(convolvePort);
        toFname := DriverPortName(convolvePort, false);
        frmFname := DriverPortName(convolvePort, true);
        ConvolveOn := false;
        LastTick := 0;
        err := FSOpen(toFname, 0, toConvolveRef);
        if err = 0 then
          err := FSOpen(frmFname, 0, frmConvolveRef);
        if err = 0 then
          begin
            If true then      { turn hardware handshaking off. }
              with handshake do
                begin
                  fCTS := 0;
                  fXOn := 0;
                  errs := parityErr + hwOverrunErr + framingErr;
                  evts := 0;
                  fInX := 0;
                  err := SerHShake(toConvolveRef, handshake);
                  err := SerHShake(frmConvolveRef, handshake);
```

```
            end; {No FSOpen error}
          err := SerReset(toConvolveRef, baudrate);
          err := SerReset(frmConvolveRef, baudrate);
{$ifc false }
          err := SerSetBuf(toConvolveRef, @serOutBuff, serBuffLen);
          err := SerSetBuf(frmConvolveRef, @serInBuff, serBuffLen);
{$endc }
          with toConvolvePB do
            begin
              ioCompletion := nil;
              ioRefNum := toConvolveRef;
              ioBuffer := Ptr(ord4(@serOutBuffA));
              ioNamePtr := nil;
            end;
          if err = noErr then
            begin
              Announce(StringOf('Convolvotron output opened on the ', UserPortName(convolvePort), '.'));
              ConvolveOn := true;
            end;
        end {with Ctron}
      end;
  end;
{------------------------------------------}
  procedure OpenConvolve (var dm: DMRec);
    {  Open the Convolve for I/O using the global configuration parameters. }
    var
      err: integer;
      str: string;
      Ct: Ctron;
  begin
    with Ctrons[dm.privatewords[CtronPosIdx]] do
      begin
{Port in use but not owned by a Convolvotron?}
        if (not (isPortAvail(convolvePort))) and (nactivechannels = 0) then
          begin     {No NOT available!}
            ConvolveOn := false;
            EnablePort(convolvePort);
            Announce(StringOf('Convolve port open failed because the ', UserPortName(convolvePort), ' is in
          use.'));
          end
        else
          begin
            if (nactivechannels = 0) then
              OpenCtron(Ctrons[dm.privatewords[CtronPosIdx]]);
            nactivechannels := nactivechannels + 1;
          end;
      end
    end; { OpenConvolve }

  procedure CloseConvolve (var dm: DMRec);
    { Close the Convolve for I/O. }
    var
      err: integer;
```

```
begin
  with Ctrons[dm.privatewords[CtronPosIdx]] do
    begin
      nactivechannels := nactivechannels - 1;
      if ConvolveOn and (nactivechannels = 0) then
        begin
          ConvolveOn := false;
          err := FSClose(toConvolveRef);
          err := FSClose(frmConvolveRef);
          EnablePort(convolvePort);
        end;
    end;
end; { CloseConvolve }

procedure doDisplay;
  var
    i: integer;
    str: Str255;
begin
  str := 'Convolve: ';
  with SendRec do
    begin
      str := StringOf(str, syncWord : 4);
      for i := 0 to IntsNum do
        str := StringOf(str, ints[i] : 6);
      Announce(str);
    end;
end;

procedure FlipWords (vect: intsptr);
{ Flip the words in the record to send out so that the high Byte is the low byte and visa-versa. }
  type
    bytesArType = packed array[0..32000] of Byte;
    bytesArTypePtr = ^bytesArType;
  var
    i: integer;
    b: Byte;
    bytesPtr: bytesArTypePtr;
begin
  with SendRec do
    begin
      bytesPtr := BytesArtypePtr(@vect^[1]);
      for i := 1 to IntsNum + 1 do
        begin
          b := bytesPtr^[0];
          bytesPtr^[0] := bytesPtr^[1];
          bytesPtr^[1] := b;
          bytesPtr := Pointer(ord4(bytesPtr) + 2);
        end;
    end;
end;

procedure doConvolve; { (var dm : DMRec) }
```

```
  var
    i, err: integer;
    l: LongInt;
    buffer: intsptr;
begin
  with Ctrons[dm.privatewords[CtronPosIdx]] do
    if ConvolveOn then
      begin
        if whichbuffer then
          buffer := @serOutBuffA[4 * dm.privatewords[channelIdx]]
        else
          buffer := @serOutBuffB[4 * dm.privatewords[channelIdx]];
      { Stuff the send record. }
        buffer^[0] := Syncword + dm.privatewords[channelIdx];
        for i := 1 to 3 do
          with dm.SlotsIn[i - 1] do
            if ptrfrm <> nil then
              buffer^[i] := ptrfrm^.i;
        if DisplayValues then
          doDisplay;
        if doFlip then
          FlipWords(buffer);
        realSendRec := SendRec;

        if (dm.privatewords[channelIdx] = nactivechannels - 1) then
          begin
            if (Interval + LastTick <= TickCount) and (toConvolvePB.ioResult <> 1) then
              begin
  { if        time to send another packet                    and        the async IO is done. }
                LastTick := TickCount;
                if whichbuffer then
                  toConvolvePB.ioBuffer := @serOutBuffA
                else
                  toConvolvePB.ioBuffer := @serOutBuffB;
                toConvolvePB.ioReqCount := nactivechannels * 8;
                err := PBWrite(@toConvolvePB, true);
                if err <> noErr then
                  Announce(StringOf('doConvolve: PBWrite error # ', err : 1));
                whichbuffer := not whichbuffer;
              end;
          end;
      end
end;
{ HandleConvolve has all the routines nessessary to pass data from the rawData array }
{ to a point in the tree after scaling and offseting them. }
 procedure HandleConvolve; {*(v : DMVerb;*}
                          {*     var dm : DMRec);*}

  var
    i: integer;
    h: handle;

  procedure Calibrate (var dm: DMRec);
```

```
    var { calibrate this Convolve/Offset dm. }
      dlog: DialogPtr;
      str:  Str255;
      i, itemHit: integer;
      l: longInt;
      itemBox: Rect;
      popStatH: Handle;
      oldPort: GrafPtr;
  begin
    with Ctrons[dm.privatewords[CtronPosIdx]] do
      begin
        GetPort(oldPort);
{    ConvolvePort := dm.privateWords[portIdx];  }
{Currently hardwired !!!}
        dlog := GetNewDialog(ConvolveDlogID, nil, Pointer(-1));
        SetPort(dlog);
        SetEdText(dlog, 1, ntos(dm.privateWords[CtronPosIdx])); {Which Ctron}
        SetEdText(dlog, 2, ntos(dm.privateWords[channelIdx])); {Which channel}
        RadioOn(dlog, DisplayItem, DisplayValues);
        GetDItem(dlog, portNameItem, i, popStatH, itemBox);
        SetIText(popStatH, UserPortName(ConvolvePort));
        repeat
          ModalDialog(nil, itemHit);
          case itemHit of
            DisplayItem:
              begin
                DisplayValues := not DisplayValues;
                RadioOn(dlog, DisplayItem, DisplayValues);
              end;
            popUpItemNo:
              begin
{    ConvolvePort := popUpPortNames(itemBox.topLeft, ConvolvePort); }
{Temporarily we hardwire the ports to the PortI and PortJ!!!}
{Choose port}
                SetIText(popStatH, UserPortName(ConvolvePort));
                dm.privateWords[portIdx] := ConvolvePort;
              end;
          end;      { case }
        until itemHit <= 2; { Until OK or Cancel is clicked. }
        if itemHit = 1 then
          begin { OK clicked. }
            if OptionIsDown then
              begin
                doFlip := not doFlip;
                Announce(StringOf('Flipping of Hi/Low bytes on words is now ', doFlip));
              end;
            GetEdText(dlog, 1, str);
            StringToNum(str, l);
            dm.privateWords[CtronPosIdx] := l;

            GetEdText(dlog, 2, str); {Setting up channel info. LEVITT}
            StringToNum(str, l);
            dm.privateWords[channelIdx] := l;
```

```
          GetEdText(dlog, 2, str);
          if str[1] = '$' then
            delete(str, 1, 1);
          while length(str) < 4 do
            str := concat('0', str);
          if length(str) > 4 then
            delete(str, 4, 100);
          StuffHex(@dm.privateWords[DisplayIdx], str);
          dm.privateWords[DisplayIdx] := ord(DisplayValues);
        end;
      DisposDialog(dlog);
      SetPort(oldPort);
    end;
  end;
begin
  if false then
    Announce(StringOf('Robot Convolve: ', v));
  case v of
    initDM:           { Called once the first time this DM is started. }
      begin
        SetDefault;
        dm.privateWords[CtronPosIdx] := defaultInterval;
        dm.privateWords[channelIdx] := defaultBaud;
        dm.privateWords[portIdx] := 1;
        DisplayValues := false;
        doFlip := true;
        Calibrate(dm);
        OpenConvolve(dm);
      end;
    massageDM:        { Called once through the main loop. do a massage }
      doConvolve(dm);
    closeDM:
      CloseConvolve(dm);        { Called when this module is deleted. Do whatever... }
    reHookedDM:
      ;      { DM has been re-hooked up. }
    fopenDM:          { This DM has just been read from a file. If it's state is }
                         { on it was hooked up properly. private points to the }
      begin           { private memory it had when saved. }
        doFlip := true;
        SetDefault;
        OpenConvolve(dm);
      end;
    fsaveDM:          { This DM is about to be saved to a file. Do any changes }
      begin           { nessessary to private memory so it can be restored later. }
        CloseConvolve(dm);
      end;
    calibDM:          { Calibrate the DM module. }
      begin
        CloseConvolve(dm);
        Calibrate(dm);
        OpenConvolve(dm);
      end;
```

```
    describeDM:         { put a description into describeStr }
      begin
        describeStr := StringOf('Convolve: ', dm.privateWords[channelIdx] : 1, '.');
      end;
    otherwise           { Should be no other. }
      GenericHandle(v, dm);
  end;        { case }
end;          { HandleConvolve }

end.
```

```
{this unit contains a big ol' complicated data acquisition dialog box that is more user friendly than}
{the old one. This new box contains all sorts of neat code to gray out unused items and to dynamically }
{disable impossible combinations of input devices}
{6.30.89 now includes doSetBaud, which displays a dialog box where users can configure the baud settings}
{for the glove and for the polhemus.}
{fixed by Scott Burgess, June, 1989}
{©1989 VPL Research, Inc.}

unit DAconfiguration;
interface
  uses
    CompileTime, ChuckStuff, scottsStuff, fastStuff, AutoLib, Globals, serialTypes;

  procedure UserSetDAconfigure;

implementation

  const
    MaxBits = 15;
    DAcfBit1Item = 3;

    DAconfigID = 2111;

    OK = 1;
    cancel = 2;

 {input items}
    VPLdataGlove = 3;
    PolhemusDevice = 4;
    STDbus = 5;
    MacClock = 6;
    MacADIOScard = 7;
    MIDI = 8;

 {serial port options }
    UseModem = 11;
    UsePrinter = 12;
    SuperMacCard = 13;
    CreativeSCard = 14;

    gloveCount = 15;
    space3Count = 16;
    adiosSlot = 17;

    readPolhemus = 18;

    multiplex = 22;
    EandF = 23;

  {items 26..28 are user items. We use the RECTs of these items to gray out DA modules'}
  {options when they are turned off.}
    gloveUserItem = 24;
```

```
  polhmUserItem = 25;
  adiosUserItem = 26;

  turnKeyItem = 28;
  baudSetItem = 29;
  hostCommItem = 30;
  hostTextItem = 31;

  DGgestItem = 33;          { Put gest into DG2 record }
  DGgloveItem = 34;         { Put glove into DG2 record }

 var
  tempBits: DABitTypeSet;
  initialize: integer;


{read adiosSlot number, number of gloves for which to search, and number of Polhemus}
{devices for which to search from edit boxes and convert them into numbers. }
 procedure postDialogCleanUp (dlogPtr: dialogPtr);
  var
   testReal: real;
 begin
  DAconfig.adiosSlot := getNumFromEditText(dlogPtr, adiosSlot);
  DAconfig.maxGBoxes := getNumFromEditText(dlogPtr, gloveCount);
  DAconfig.maxPolhms := getNumFromEditText(dlogPtr, space3Count);
 end;

 procedure DisplayDLOGitem (dlogPtr: dialogPtr; whichItem: integer; visible: boolean);
  var
   itemType: integer;
   item: handle;
   box: rect;
   itemCH: controlHandle;
 begin
  GetDItem(dlogPtr, whichItem, itemType, item, box);
  itemCH := pointer(item);
  if visible then
   hiliteControl(itemCH, 0)
  else
   hiliteControl(itemCH, 255)
 end;


{because they are not exactly supported by the Mac ROM, one must gray out text edit boxes}
{and static text boxes oneself. Toggle item grays out those that contain text items: the glove,}
{the polhemus, and the ADIOS card.}
 procedure toggleItem (dlogPtr: dialogPtr; itemHit: integer; itsBit: DABitType; userItem: integer;
      changeState: boolean);
  var
   itemType: Integer;
   item: Handle;
   box: Rect;
 begin
```

```
    GetDItem(dlogPtr, userItem, itemType, item, box);
    if changeState then
      if itsBit in tempBits then
        tempBits := tempBits - [itsBit]
      else
        tempBits := tempBits + [itsBit];

    if itsBit in tempBits then
      invalRect(box)
    else
      shadeOut(box);
    if itemHit = VPLdataGlove then
      begin
        DisplayDLOGitem(dlogPtr, readPolhemus, itsBit in tempBits);
        DisplayDLOGitem(dlogPtr, DGgestItem, itsBit in tempBits);
        DisplayDLOGitem(dlogPtr, DGgloveItem, itsBit in tempBits);
      end;
    RadioOn(dlogPtr, itemHit, itsBit in tempBits);
  end;

  procedure doSetADIOS;
    const
      adiosID = 2025;

      oneGlove = 3;
      twoGloves = 4;
      dataSuit = 5;
      controls = 6;
    var
      thisDLOG: dialogPtr;
      oldPort: grafPtr;
      itemHit: integer;
      oldItem: integer;
  begin
    getPort(oldPort);
    thisDLOG := GetNewDialog(adiosID, nil, pointer(-1));

    PositionWindow(thisDLOG, 50, 50);

    RadioOn(thisDLOG, DAconfig.adiosUse, true);
    oldItem := DAconfig.adiosUse;
    setPort(thisDLOG);
    drawDialog(thisDLOG);
    showWindow(thisDLOG);

    repeat
      modalDialog(nil, itemhit);
      if itemHit > 2 then
        begin
          RadioOn(thisDLOG, oldItem, false);
          RadioOn(thisDLOG, itemHit, true);
          oldItem := itemHit;
        end;
```

```
  until itemHit = 1;
  DAconfig.adiosUse := oldItem;
  disposDialog(thisDLOG);
  setPort(oldPort);
 end;


 procedure doSetBaud;
  const
   baudBoxID = 2012;
   gloveSel = 3;
   polhmSel = 4;
   baud19200 = 5;
   baud9600 = 6;
   baud4800 = 7;
   stop2 = 9;
   stop15 = 10;
   stop1 = 11;

   glove = 0;
   pohlm = 1;
  var
   baudBox: dialogPtr;
   itemHit: integer;
   oldPort: grafPtr;
   x: integer;
   tempBaud: baudTypeSet;
   currentDevice: integer;   {either glove or polhemus}

  procedure appropriateBauds (settings: baudTypeSet);
  begin
   if b192 in settings then
    RadioOn(baudBox, baud19200, true)
   else
    RadioOn(baudBox, baud19200, false);
   if b96 in settings then
    RadioOn(baudBox, baud9600, true)
   else
    RadioOn(baudBox, baud9600, false);
   if b48 in settings then
    RadioOn(baudBox, baud4800, true)
   else
    RadioOn(baudBox, baud4800, false);
  end;

  procedure appropriateStops (settings: baudTypeSet);
  begin
{   baudRateType = (b192, b96, b48, s1, s15, s2);}

    if s1 in settings then
     RadioOn(baudBox, stop1, true)
    else
```

```
      RadioOn(baudBox, stop1, false);
    if s15 in settings then
      RadioOn(baudBox, stop15, true)
    else
      RadioOn(baudBox, stop15, false);
    if s2 in settings then
      RadioOn(baudBox, stop2, true)
    else
      RadioOn(baudBox, stop2, false);
  end;

begin
  getPort(oldPort);
  baudBox := nil;
  baudBox := GetNewDialog(baudBoxID, nil, Pointer(-1));
  x := ResError;
  itemHit := 0;
  tempBaud := DAconfig.gloveBaud;

  appropriateStops(DAconfig.gloveBaud);
  appropriateBauds(DAconfig.gloveBaud);
  currentDevice := glove;

  showWindow(baudBox);
  drawDialog(baudBox);
  setPort(baudBox);

  RadioOn(baudBox, gloveSel, true);   {initialize to set glove }
  repeat
    modalDialog(nil, itemHit);
    case itemHit of
      gloveSel:
        begin
          radioOn(baudBox, gloveSel, true);
          currentDevice := glove;
          DAconfig.polhmBaud := tempBaud;
          tempBaud := DAconfig.gloveBaud;
          radioOn(baudBox, polhmSel, false);
          appropriateStops(DAconfig.gloveBaud);
          appropriateBauds(DAconfig.gloveBaud);
        end;

      polhmSel:
        begin
          radioOn(baudBox, gloveSel, false);
          currentDevice := pohlm;
          DAconfig.gloveBaud := tempBaud;
          tempBaud := DAconfig.polhmBaud;
          radioOn(baudBox, polhmSel, true);
          appropriateBauds(DAconfig.polhmBaud);
          appropriateStops(DAconfig.polhmBaud);
        end;
```

```
baud19200:
  begin
    tempBaud := tempBaud + [b192];
    if b96 in tempBaud then
      tempBaud := tempBaud - [b96]
    else
      tempBaud := tempBaud - [b48];
    appropriateBauds(tempBaud);
  end;


baud9600:
  begin
    tempBaud := tempBaud + [b96];
    if b192 in tempBaud then
      tempBaud := tempBaud - [b192]
    else
      tempBaud := tempBaud - [b48];
    appropriateBauds(tempBaud);
  end;

baud4800:
  begin
    tempBaud := tempBaud + [b48];
    if b96 in tempBaud then
      tempBaud := tempBaud - [b96]
    else
      tempBaud := tempBaud - [b192];
    appropriateBauds(tempBaud);
  end;

stop1:
  begin
    tempBaud := tempBaud + [s1];
    if s15 in tempBaud then
      tempBaud := tempBaud - [s15]
    else
      tempBaud := tempBaud - [s2];
    appropriateStops(tempBaud);
  end;

stop15:
  begin
    tempBaud := tempBaud + [s15];
    if s2 in tempBaud then
      tempBaud := tempBaud - [s2]
    else
      tempBaud := tempBaud - [s1];
    appropriateStops(tempBaud);
  end;

stop2:
  begin
```

```
        tempBaud := tempBaud + [s2];
        if s1 in tempBaud then
          tempBaud := tempBaud - [s1]
        else
          tempBaud := tempBaud - [s15];
        appropriateStops(tempBaud);
      end;
    otherwise
      ;
   end;    { case }
  until itemHit = 1;
  if currentDevice = glove then
    DAconfig.gloveBaud := tempBaud
  else
    DAconfig.polhmBaud := tempBaud;

  disposDialog(baudBox);
  setPort(oldPort);
 end;

 procedure HostConfigure;
{ Put up a dialog box and let the user set the baud rate, etc for }
{ the host.  Then do the change if the user clicks OK. }

  const
    ConfigHID = 1540;        { Host Config dialog box resource number. }
     { Item numbers for buttons in the Host Configuration dialog box. }
    StartBaud = 5;        { First dialog Item that is a baud rate. }
    BaudNum = 10;
    StartParity = 16;        { First dialog Item that is parity. }
    ParityNum = 3;
    StartStops = 20;         { First dialog Item that is a stop bit. }
    StopNum = 3;
    StartChange = 23;           { First dialog Item that is a Change selection. }
    ChangeNum = 2;

  var
    dlogPtr: DialogPtr;
    itemHit, i: integer;
    btn: array[0..3] of integer;
{ Port config btns: Baudrate, Stops, Parity, Port. }
    BtnDesc: array[0..4] of record
        start, num: integer;
      end;
    OldPort: GrafPtr;

  procedure SetUpBtns;
      { Setup the relationship between the buttons in the two configuration}
{         dialog boxes and how the buttons relate to the rest of the program. }
  begin
    BtnDesc[0].start := StartBaud;
    BtnDesc[1].start := StartParity;
    BtnDesc[2].start := StartStops;
```

```
    BtnDesc[3].start := StartChange;
    BtnDesc[0].num := Baudnum;
    BtnDesc[1].num := Paritynum;
    BtnDesc[2].num := Stopnum;
    BtnDesc[3].num := Changenum;
  end; { SetUpBtns }

begin
  SetUpBtns;
  with DAconfig.HostConfig do
    begin
      btn[0] := BaudRate;
      btn[1] := Parity;
      btn[2] := Stops;
      btn[3] := Change;
    end;
  GetPort(OldPort);
  dlogPtr := GetNewDialog(ConfigHID, nil, Pointer(-1));
  SetPort(dlogPtr);
  PositionWindow(dlogPtr, 50, 30);
  for i := 0 to 3 do
    RadioRange(dlogPtr, BtnDesc[i].start, BtnDesc[i].num, btn[i]);
  ShowWindow(dlogPtr);
  DrawDialog(dlogPtr);
  repeat
    ModalDialog(nil, itemHit);
    for i := 0 to 3 do
      with BtnDesc[i] do
        if (ItemHit >= start) and (ItemHit < start + num) then
          begin
            btn[i] := ItemHit - start;
            RadioRange(dlogPtr, start, num, btn[i]);
          end;
  until itemHit <= 2;
  if ItemHit = 1 then
    begin { User hit OK }
      with DAconfig.HostConfig do
        begin
          BaudRate := btn[0];
          Parity := btn[1];
          Stops := btn[2];
          Change := btn[3];
        end;
    end;
  DisposDialog(dlogPtr);
  SetPort(OldPort);
end; { ConfigureBox }


function filterProc (theDLOG: dialogPtr; var theEvent: eventRecord; var itemHit: integer): boolean;
begin
  if initialize < 5 then
    begin
```

```
      toggleItem(theDLOG, VPLdataGlove, GBiiBit, gloveUserItem, false);
      toggleItem(theDLOG, polhemusDevice, polhmBit, polhmUserItem, false);
      toggleItem(theDLOG, MacADIOScard, adiosBit, adiosUserItem, false);
      initialize := initialize + 1;
    end;

   filterProc := false;
  end;

  procedure UserSetDAconfigure;
   { Let the user set the Data Aquisition configuration. }
   const
    DAcfResType = 'DAcf';
    DAcfBit1Item = 3;
   var
    i, itemHit: Integer;
    on: boolean;
    dlogPtr: DialogPtr;

    cb: DABitType;
    itemType: Integer;
    str2numVal: LongInt;
    item: Handle;
    box: Rect;
    text: Str255;

    oldPort: grafPtr;
    itemCH: ControlHandle;


{DAserialType = (modemP, printerP, superMacC, creativeSC, wantsModem, wantsPrinter);}
{DAmidiSetupType = (onM, offM, modemMP, printerMP); }


  begin
   getPort(oldPort);
   InitCursor;
   initialize := 0;
   flushEvents(everyEvent, 0);
   dlogPtr := GetNewDialog(DAconfigID, nil, Pointer(-1));
   PositionWindow(dlogPtr, 50, 50);
   tempBits := DAconfig.bits;

   setPort(dlogPtr);

{this block of code initializes the state of the buttons by turning any active}
{options on when the dialog appears. }
   for cb := DABitType(0) to DABitType(5) do
     RadioOn(dlogPtr, DAcfBit1Item + ord(cb), cb in DAconfig.bits);

   RadioOn(dlogPtr, hostCommItem, hostBit in DAconfig.bits);
{$ifc not DoHost }
   HideDItem(dlogPtr, hostCommItem);
```

```
    HideDItem(dlogPtr, hostTextItem);
{$endc }
    RadioOn(dlogPtr, readPolhemus, rdPolhm in DAconfig.bits);
    RadioOn(dlogPtr, DGgestItem, rdGest in DAconfig.bits);
    RadioOn(dlogPtr, DGgloveItem, rdGlove in DAconfig.bits);

    NumToEditText(dlogPtr, gloveCount, DAconfig.maxGBoxes);
    NumToEditText(dlogPtr, adiosSlot, DAconfig.adiosSlot);
    NumToEditText(dlogPtr, space3Count, DAconfig.maxPolhms);

    if DF_MultiBit in tempBits then
      radioOn(dlogPtr, multiplex, true);
    if DF_EandFBit in tempBits then
      radioOn(dlogPtr, EandF, true);
    if midiBit in tempBits then
      radioOn(dlogPtr, MIDI, true);

    if not (flashBit in DAconfig.bits) then
      begin
        DisplayDLOGitem(dlogPtr, EandF, false);
        DisplayDLOGitem(dlogPtr, multiplex, false);
      end;

    if turnKeyBit in tempBits then
      radioOn(dlogPtr, turnKeyItem, true);

    if modemP in DAconfig.serialConfig then
      RadioOn(dlogPtr, useModem, true);
    if printerP in DAconfig.serialConfig then
      RadioOn(dlogPtr, usePrinter, true);
    if superMacC in DAconfig.serialConfig then
      RadioOn(dlogPtr, SuperMacCard, true);
    if creativeSC in DAconfig.serialConfig then
      RadioOn(dlogPtr, CreativeSCard, true);

    ShowWindow(dlogPtr);

    repeat
      ModalDialog(@filterProc, itemHit);
      case itemHit of
{note: the special cases of the glove item, polhemus item, and adios item are handled in the filter}
{proc, because there we can gray out the text items relatively well.}

{here an input device has been activated or deactivated. It is time to add this item to}
{the DAconfig bits.}
        VPLDataGlove:
          toggleItem(dlogPtr, VPLdataGlove, GBiiBit, gloveUserItem, true);
        PolhemusDevice:
          toggleItem(dlogPtr, polhemusDevice, polhmBit, polhmUserItem, true);
        MacADIOScard:
          begin
            toggleItem(dlogPtr, MacADIOScard, adiosBit, adiosUserItem, true);
            GetDItem(dlogPtr, MacADIOScard, itemType, item, box);
```

```
    if (getCtlValue(controlHandle(item)) <> 0) then
      doSetADIOS;
  end;

hostCommItem:
  begin
    if hostBit in tempBits then
      tempBits := tempBits - [hostBit]
    else
      tempBits := tempBits + [hostBit];
    RadioOn(dlogPtr, hostCommItem, hostBit in tempBits);
    if hostBit in tempBits then
      HostConfigure;
  end;

MacClock:
  begin
    cb := DABitType(itemHit - DAcfBit1Item);
    if cb in tempBits then
      tempBits := tempBits - [cb]
    else
      tempBits := tempBits + [cb];
    RadioOn(dlogPtr, itemHit, cb in tempBits);
  end;

baudSetItem:
  begin
    doSetBaud;
  end;


STDbus:
  begin
    if flashBit in tempBits then
      begin
        tempBits := tempBits - [flashBit];
        DisplayDLOGitem(dlogPtr, multiplex, false);
        DisplayDLOGitem(dlogPtr, EandF, false);
      end
    else
      begin
        tempBits := tempBits + [flashBit];
        DisplayDLOGitem(dlogPtr, multiplex, true);
        DisplayDLOGitem(dlogPtr, EandF, true);
      end;
    RadioOn(dlogPtr, itemHit, flashBit in tempBits);
  end;


MIDI:
  begin  {handle the case of on versus off.}
    if (midiBit in tempBits) then
      begin
```

```
      tempBits := tempBits - [midiBit];
      radioOn(dlogPtr, MIDI, false);
    end
  else
    begin
      tempBits := tempBits + [midiBit];
      radioOn(dlogPtr, MIDI, true);
    end;
end;


UseModem:
 if modemP in DAconfig.serialConfig then
   begin
     RadioOn(dlogPtr, UseModem, false);
     DAconfig.serialConfig := DAconfig.serialConfig - [modemP, wantsModem];
   end
 else
   begin
     RadioOn(dlogPtr, UseModem, true);
     DAconfig.serialConfig := DAconfig.serialConfig + [modemP, wantsModem];
   end;


UsePrinter:
 if printerP in DAconfig.serialConfig then
   begin
     RadioOn(dlogPtr, UsePrinter, false);
     DAconfig.serialConfig := DAconfig.serialConfig - [printerP, wantsPrinter];
   end
 else
   begin
     RadioOn(dlogPtr, UsePrinter, true);
     DAconfig.serialConfig := DAconfig.serialConfig + [printerP, wantsPrinter];

   end;

SuperMacCard:
 if superMacC in DAconfig.serialConfig then
   begin
     RadioOn(dlogPtr, SuperMacCard, false);
     DAconfig.serialConfig := DAconfig.serialConfig - [superMacC];
   end
 else
   begin
     RadioOn(dlogPtr, SuperMacCard, true);
     DAconfig.serialConfig := DAconfig.serialConfig + [superMacC];
   end;

CreativeSCard:
 if creativeSC in DAconfig.serialConfig then
   begin
     RadioOn(dlogPtr, CreativeSCard, false);
```

```
      DAconfig.serialConfig := DAconfig.serialConfig - [creativeSC];
    end
  else
    begin
      RadioOn(dlogPtr, CreativeSCard, true);
      DAconfig.serialConfig := DAconfig.serialConfig + [creativeSC];
    end;

turnKeyItem:
  if turnKeyBit in tempBits then
    begin
      RadioOn(dlogPtr, turnKeyItem, false);
      tempBits := tempBits - [turnKeyBit];
    end
  else
    begin
      RadioOn(dlogPtr, turnKeyItem, true);
      tempBits := tempBits + [turnKeyBit];
    end;


multiplex:
  if DF_MultiBit in tempBits then
    begin
      tempBits := tempBits - [DF_MultiBit];
      radioOn(dlogPtr, multiplex, false);
    end
  else
    begin
      tempBits := tempBits + [DF_MultiBit];
      radioOn(dlogPtr, multiplex, true);
    end;

EandF:
  if DF_EandFBit in tempBits then
    begin
      tempBits := tempBits - [DF_EandFBit];
      radioOn(dlogPtr, EandF, false);
    end
  else
    begin
      tempBits := tempBits + [DF_EandFBit];
      radioOn(dlogPtr, EandF, true);
    end;

readPolhemus:
  if rdPolhm in tempBits then
    begin
      RadioOn(dlogPtr, readPolhemus, false);
      tempBits := tempBits - [rdPolhm];
    end
  else
    begin
```

```
          RadioOn(dlogPtr, readPolhemus, true);
          tempBits := tempBits + [rdPolhm];
        end;
    DGgestItem:
      begin
        if rdGest in tempBits then
          tempBits := tempBits - [rdGest]
        else
          tempBits := tempBits + [rdGest];
        RadioOn(dlogPtr, itemHit, rdGest in tempBits);
      end;
    DGgloveItem:
      begin
        if rdGlove in tempBits then
          tempBits := tempBits - [rdGlove]
        else
          tempBits := tempBits + [rdGlove];
        RadioOn(dlogPtr, itemHit, rdGlove in tempBits);
      end;

{if the midi is in use, the midi port must be turned off for use with other }
{serial devices.  For example, if MIDI is on the printer port, then no gloves}
{or polhemuses can be found on that port.  Due to the dearth of MIDI drivers}
{and the temperament of MIDI devices, MIDI must have an exclusive port }
{and must not be sent messages like "$C." }

      otherwise
        ;

    end;  {case itemHit}

  until itemHit <= 2;  { Until OK or Cancel is clicked. }
  if itemHit = 1 then
    begin { OK clicked. }
      DAconfig.bits := tempBits;

      postDialogCleanUp(dlogPtr);
      UseResFile(ApplRes);
      AddPtrResource(@DAconfig, sizeof(DAconfigRec), DAcfResType, 0, 'DA configuration');
    end;

  DisposDialog(dlogPtr);

  setPort(oldPort);
 end;

end.
```

```
{ This unit has miscelaneous Data Acquisition modules in it. }
{ Also contains the play/record code}

unit DataAqUnit;

Interface
  uses
    CompileTime, ChuckStuff, Globals, AutoLib, MiscRoutines, RawUnit, serialTypes, serialRoutines,
        serialSetUp,{}
    DAGloveIO, GBIIBox, ChucksDAs, PolDAMod, DataFlash, MacADIOSutils, macADIOSDAcq, MIDI, initMIDI,
        DAconfiguration;

  var
    SingleStep,             { True if Single stepping through the DA playback. }
    PlaySubLoopOn,          {True if playing subloop}
    RewindOn,               {True if Rewinding rawdata}
    FastForwardOn,          {True if Fastforward is on}
    DispFFOn,               {True if Visual Fastforward is on}
    DispRewOn,              {True if Visual Rewind is On}
    RecRawOn,               {True if recording raw data. }
    CounterOn,              {True if counter window is On}
    PlayRawOn: boolean;     {True if playing back recorded raw data.}

  procedure InitDataAq;
  procedure CloseDataAq;
  procedure QuitDataAq;

{ Do all the Data Acquisition currently active. }
  procedure DataAcquisition;
  procedure ChangeRewind;
  procedure ChangeRecRaw (newState: boolean);
  procedure ChangePlayRaw (newState: boolean);
  procedure TogRawDisp;  { Toggle showing the raw display from decimal to hex. }
  procedure ResetAllDAs; { Send a reset to all the DA modules. }
  procedure doDAMenu (Item_No: integer);
  procedure LoopKey (val: char);

  procedure DMAliases (resNum: integer; get, purgeFirst: Boolean);
  procedure RawMouse (var Slot: SlotDesc; ev: EventRecord; idx: Integer);

implementation

  const
    AliasResType = 'ALIS';        { Resource type for the alias list. }
    AliasID = 1;                  { Resource id for the alias list. }
    AliasBit = 1;                 { Bit in the rawDatDef that says this is an alias. }

    RDFileType = 'DSRW';   { Raw data file type for finder. }
    RDVersion = 1;        { Current version for RD files. }
    RDGlobType = 'RDgb';   { Global information for RD files. defined in RDfileGlobType }
    RawDataType = 'RDat';  { Raw Data resource type. }
```

```
 type      { **cb** }
{ RDfileHeaderType is the global resource for a raw data file. }
   RDfileGlobType = record
      version,                  { file version number. }
      recSize: integer;         { size of saved record - 4 for jiffy count. }
      SavedNames: array[rawDataIndex] of nameStr;
    end;
   RDfileGlobPtr = ^RDfileGlobType;
   RDfileGlobHandle = ^RDfileGlobPtr;

 type
   AliasRecord = record                       { Record for one entry in the alias list. }
      orig, alias: NameStr;
    end;
   AliasesType = array[1..32000] of AliasRecord;   { Definition for an open ended alias list array. }
   AliasPtr = ^AliasesType;
   AliasHandle = ^AliasPtr;

 var
   recPtr, playPtr: Ptr;   { pointers for recording and playing raw data. }
   recEndPtr, playEndPtr: Ptr;
   recordedSize: longInt;  { number of bytes already recorded. }
   recBuffH: handle;    { handle to the record buffer. }
   recJiffy, playJiffy: longint;   { jiffy count when recording or playing started. }
   LastRecJiff: longint; { time of last record. Used so recording not > 30hz }
   recNum: integer;    { number of bytes in a recorded record }
   reclooped: boolean;       {true if the recorder filled the allocated RAM >= once}
   loop: boolean;        { true if you want the raw to loop. }
   hz30: boolean;            { true if don't record any faster than 30hz. }
   hz30dyItem: integer;    { dynamic item number for the 30hz menu item. }
   subloopinited: boolean; {true if subloop has been initialized}
   slStart, slEnd: longint;  .{boundarys of subloop play}
   dispcount: longint;            {the display count value}
   playStartPtr: Ptr;           { Pointer to the beginning of the subloop}
   FirstAqDy: integer;     { First Dynamic Item number for items in the DA menu. }

   { Information about rawData array aliases. These are names that are used in place of the normal names.
      }
   AliasH: AliasHandle;        { Handle to the current Alias list. (Not a resource) }
   AliasSize: integer;         { Number of entries in the list. }
   AliasFrom: inFileType;      { where the AliasH came from. Either a DM file or the application. }
   AliasEdit,                  { True if alias editing is currently active. }
   AliasDirty,                 { True if the current alias list has been edited. }
   AliasShow: Boolean;         { True if aliases in the rawData array are procceded by an '_'. }

  procedure SetRecPlayMenu;
{ Set what the Record/Play menu should look like based on DA globals. }
  begin
    EnDisItem(DAMHndl, SaveRItem, (recBuffH <> nil));
    EnDisItem(DAMHndl, PlayRItem, (recBuffH <> nil));
    CheckItem(DAMHndl, RecRItem, RecRawOn);
    CheckItem(DAMHndl, PlayRItem, PlayRawOn);
    CheckItem(DAMHndl, dyItemtoItem(DAMHndl, hz30dyItem), hz30);
```

```
end;

procedure ResetAllDAs; { Send a reset to all the DA modules. }
  var
    i: integer;
begin
  if polhmBit in DAconfig.bits then
    for i := 1 to numPolhms do
      if Polhms[i] <> nil then
        if PolDA(polhms[i], resetDA) = 0 then
          polhms[i]^.serBlock.dar.state := DAon;
  if gbiiBit in DAconfig.bits then
    for i := 1 to numGloves do
      if gBoxes[i] <> nil then
        if GBIIBox(gBoxes[i], resetDA) = 0 then
          gBoxes[i]^.serBlock.dar.state := DAon;
  if ClockBit in DAconfig.bits then
    if CycleDA(resetDA, cycleDAR) = 0 then
      cycleDAR.state := DAon;
  if flashBit in DAconfig.bits then
    if flashDA(resetDA, flashDAR) = 0 then
      flashDAR.state := DAon;
  recJiffy := Ticks^;
end; {ResetAllDAs}

procedure tog30hz (dyItem: integer);
begin
  hz30 := not hz30;
  CheckItem(DAMHndl, dyItemtoItem(DAMHndl, dyItem), hz30);
end;

procedure menuSetOneShot (dyItem: integer);
  { Toggle glove box one-shot mode.  When true the gloves send a request whenever they }
  { want a record.  When false the tell the glove boxes to go into continuous mode. }
  { Continuous mode not fully debugged.  Stay with one-shot mode. }
begin
  gOneShot := not gOneShot;
  if not gOneShot then
    begin
      DG60hz := OptionIsDown;
      if DG60hz then
        Announce('DGII 60hz continuous mode set.')
      else
        Announce('DGII 30hz continuous mode set.')
    end;
  CheckItem(DAMHndl, dyItemtoItem(DAMHndl, dyItem), not gOneShot);
  ResetAllDAs;
end;

procedure InvalidateRaw;
  { Invalidate the raw window so it will be totally redrawn. }
  var
    oldPort: GrafPtr;
```

```
begin
  GetPort(oldPort);
  with RawDesc do
    begin
      SetPort(wp);
      InvalRect(wp^.portRect);
    end;
  SetPort(oldPort);
  HookupFlag := true;      { Tell the DM's to rehookup in case raw names have changed. }
end;

function FindAlRaw (findName: NameStr; isal: Boolean): integer;
  { Find a in the rawdata array.  If isal look only for names with their AliasBit set }
  { else look only for names with the AliasBit clear. }
  { return -1 if not found. }
  var
    i: integer;
begin
  i := 0;
  FindAlRaw := -1;
  repeat
    with rawDataDef[i] do
      if EqualString(name, findName, false, false) then
        if isal = (BAND(flags, AliasBit) <> 0) then
          begin
            FindAlRaw := i;
            leave;
          end;
    i := i + 1;
  until (i > RawDesc.numUsed);
end;

function FindAlias (a: NameStr): integer;
{ Return the index into AliasH^^ for an alias with this name.  If not found }
{ return -1. }
  var
    i: integer;
begin
  for i := 1 to AliasSize do
    with AliasH^^[i] do
      if a = alias then
        begin
          FindAlias := i;
          exit(FindAlias);
        end;
  FindAlias := -1;
end;

procedure AddAlias (origName, aliasName: string);
  { Add an alias to the AliasList at AliasH.  Expand the memory size to fit the new entry. }
begin
  AliasSize := AliasSize + 1;
  SetHandleSize(Handle(AliasH), sizeof(AliasRecord) * AliasSize);
```

```
   if MemError = noErr then
    begin
     AliasH^^[AliasSize].orig := ValidName(origName);
     AliasH^^[AliasSize].alias := ValidName(aliasName);
    end
   else
    AliasSize := AliasSize - 1;
 end;

 procedure DeleteAlias (ai: integer);
  { Delete the alias at AliasH^^[index].  shrink memory. }
  var
   i: integer;
 begin
  for i := ai + 1 to AliasSize do
   AliasH^^[i - 1] := AliasH^^[i];
  AliasSize := AliasSize - 1;
  SetHandleSize(Handle(AliasH), sizeof(AliasRecord) * AliasSize);
 end;

 procedure RemoveAliases (purge: Boolean);
  { Remove the current alias list from the rawData array.  If purge is true then release the memory }
  { used by the current AliasH and set it to null. }
  var
   i, j: integer;
 begin
  if AliasH = nil then
   exit(RemoveAliases);
  Hlock(Handle(AliasH));
  for i := 1 to AliasSize do
   with AliasH^^[i] do
    begin
     if AliasShow then
      j := FindAlRaw(concat('_', alias), true)
     else
      j := FindAlRaw(alias, true);
     if j >= 0 then
      with rawDataDef[j] do
       begin
        name := orig;
        flags := BAND(BNOT(AliasBit), flags);
       end;
    end;
  HUnlock(Handle(AliasH));
  if purge then
   begin
    DisposHandle(Handle(AliasH));
    AliasH := nil;
    AliasSize := 0;
   end;
  AliasShow := false;
  InvalidateRaw;
 end;
```

I

```
procedure LoadAliases (resNum: integer);
  { Load aliases from the given file.  AliasH is either nil or invalid. }
  { If the resource isn't found make AliasH point to an empty piece of data. }
  var
    oldRes: integer;
begin
  oldRes := CurResFile;
  UseResFile(resNum);
  AliasH := AliasHandle(Get1Resource(AliasResType, AliasID));
  UseResFile(oldRes);
  if AliasH <> nil then
    DetachResource(Handle(AliasH))
  else
    AliasH := AliasHandle(NewHandle(0));
  AliasSize := GetHandleSize(Handle(AliasH)) div sizeof(AliasRecord);
  if resNum = applRes then
    AliasFrom := ApplRad
  else
    AliasFrom := DMRad;
  AliasDirty := false;
  AliasShow := false;
end;

procedure InstallAliases (show: Boolean);
  { Install aliases into the rawDataArray. }
  { If show is true then show which are aliases by putting a '_' in front of them. }
  { The global variable AliasShow will reflect whether there is a '_' or not. }
  var
    i, j: integer;
    n: NameStr;
begin
  if AliasH <> nil then
    begin
      Hlock(Handle(AliasH));
      for i := 1 to AliasSize do
        with AliasH^^[i] do
          begin
            j := FindAlRaw(orig, false);
            if j >= 0 then
              begin
                if show then
                  n := ValidName(concat('_', alias))
                else
                  n := alias;
                with rawDataDef[j] do
                  begin
                    name := n;
                    flags := BOR(flags, AliasBit);     { Set bit that say's this is an alias. }
                  end;
              end;
          end;
      HUnlock(Handle(AliasH));
```

```
      InvalidateRaw;
      AliasShow := show;
    end;
  end;

  procedure SaveAliases (resNum: integer);
   { Save a copy of the current Alias list to the given resource file.  Don't change AliasH. }
   var
     oldRes: integer;
  begin
   if AliasH <> nil then
     begin
       oldRes := CurResFile;
       UseResFile(resNum);
       HLock(Handle(AliasH));
       AddPtrResource(Pointer(AliasH^), GetHandleSize(Handle(AliasH)), AliasResType, AliasID, 'Aliases');
       HUnLock(Handle(AliasH));
       UseResFile(oldRes);
       AliasDirty := false;
       if (resNum = applRes) then
         AliasFrom := applRad
       else
         AliasFrom := DMRad;
     end;
  end;

  procedure DMAliases (resNum: integer; get, purgeFirst: Boolean);
   { A DM file is being opened or closed.  Handle the alias list associated with the file. }
  begin
   if get then
     begin
       if purgeFirst then
         begin
           if AliasDirty and (AliasFrom = ApplRad) then
             SaveAliases(ApplRes);
           RemoveAliases(true);        { Get rid of existing aliases }
           LoadAliases(resNum);
           InstallAliases(AliasShow);
         end;
     end
   else
     begin
       SaveAliases(resNum);
     end;
  end;

  procedure RawMouse (var Slot: SlotDesc; ev: EventRecord; idx: Integer);
   { The user has clicked in the Raw window.  If AliasEdit is true then edit the aliases. }
   var
     origStr, aliasStr: Str255;
     ai: integer;
     show: Boolean;
  begin
```

```
    if not AliasEdit then
      exit(RawMouse);

{$ifc Debug }
    show := AliasShow;
    if AliasShow then
      aliasStr := Omit(rawDataDef[idx].name, 1, 1)
    else
      aliasStr := rawDataDef[idx].name;
    if BAND(rawDataDef[idx].flags, AliasBit) = 0 then
      ai := -1
    else
      ai := FindAlias(aliasStr);
    if ai <= 0 then
      begin
        origStr := rawDataDef[idx].name;
        aliasStr := '';
      end
    else
      begin
        origStr := AliasH^^[ai].orig;
        aliasStr := AliasH^^[ai].alias;
      end;
    if GetStrings(concat('Original name is "', origStr, '".', chr(13), 'Alias name?'), '', aliasStr, aliasStr)
        then
      begin
        RemoveAliases(false);
        if ai > 0 then
          begin          { The alias existed already. }
            if aliasStr = '' then
              DeleteAlias(ai)
            else
              AliasH^^[ai].alias := ValidName(aliasStr);
          end
        else
          AddAlias(origStr, aliasStr);
        InstallAliases(show);
        AliasDirty := true;
      end;
{$endc }
  end;

  procedure ReConfigIO (dyItem: integer);
  Forward;

  procedure reInitDataAq;
    { Called at start by InitDataAq and everytime the user reconfigures I/O. }
    { Do any initializing nessassary for the Data Acquisition routine. }
    { This includes calling initDA for all active DA modules. }
    var
      i: integer;
      midiIn: longint;
  begin
```

```
loop := false;                { for now, don't loop raw records. }
RecRawOn := false;
PlayRawOn := false;
FirstAqDy := dyNewItem(DAMHndl, 'Reconfigure Raw', @ReConfigIO, false);
hz30 := false;
hz30dyItem := dyNewItem(DAMHndl, 'Record at 30hz', @tog30hz, false);

gOneShot := true;
DG60hz := false;
pOneShot := true;
setPortsAvailable;
if (gBoxes[1] <> nil) then
  i := dyNewItem(DAMHndl, 'Continuous Glove', @menuSetOneShot, false);

timeDAR.state := DAoff;
cycleDAR.state := DAoff;
flashDAR.state := DAoff;
adiosDAR.state := DAoff;

{even though no MIDI in is accepted at this point, the buffer must be cleared to prevent an overflow.}
{thus, grab the info and ignore it. }

if flashBit in DAconfig.bits then
  if flashDA(initDA, flashDAR) = 0 then
    flashDAR.state := DAon;
if ClockBit in DAconfig.bits then
  begin
    if TimeDA(initDA, timeDAR) = 0 then
      timeDAR.state := DAon;
    if CycleDA(initDA, cycleDAR) = 0 then
      cycleDAR.state := DAon;
  end;
if ADIOSbit in DAconfig.bits then
  if MacADIOSDA(initDA, adiosDAR) = 0 then
    adiosDAR.state := DAon;

InstallAliases(AliasShow);

recJiffy := Ticks^;
recordedSize := 0;
recRawOn := false;
playRawOn := false;
PlaySubLoopOn := false;
RewindOn := false;
DispFFon := false;
DispRewOn := false;
CounterOn := false;
SingleStep := false;
recBuffH := nil;
dispcount := 0;
SetRecPlayMenu;
end;
```

```
procedure CloseDataAq;
  var
    i, k: integer;
    b: Boolean;
begin
  i := FirstAqDy;
  repeat
    b := dyDelItem(DAMHndl, i);
    i := i + 1;
  until not b;

  ClosePorts;
  if cycleDAR.state = DAon then
    k := cycleDA(closeDA, cycleDAR);
  if flashDAR.state = DAon then
    k := flashDA(closeDA, flashDAR);
  if timeDAR.state = DAon then
    k := timeDA(closeDA, timeDAR);
  if adiosDAR.state = DAon then
    k := MacADIOSDA(closeDA, adiosDAR);
  timeDAR.state := DAoff;
  cycleDAR.state := DAoff;
  flashDAR.state := DAoff;
  adiosDAR.state := DAon;

  CloseSlot(RawDesc, RawWindID);
  if recBuffH <> nil then
    DisposHandle(recBuffH);
  recBuffH := nil;
end;

procedure InitDataAq;
  { This is called once at the beginning of the program.  reInitDataAq is called everytime the user
      Reconfigures I/O. }
begin
  AliasEdit := false;
  AliasShow := false;
  LoadAliases(applRes);
  reInitDataAq;
end;

procedure QuitDataAq;
  { Called when the program is finally quiting. }
begin
  CloseDataAq;
  if AliasDirty and (AliasFrom = ApplRad) then
    SaveAliases(applRes);
end;

procedure ReConfigIO (dyItem: integer);
  { Put the user configure dialog box up and let the user reconfigure the I/O they want.  Then }
  { reinitialize DataAquisition to look again for I/O devices. }
  var
```

```
    i: integer;
  begin
    CloseDataAq;
    UserSetDAconfigure;
    InitRaw;
    reInitDataAq;
    HookupFlag := true;  { Signal that DM's need to be rehooked up. }
  end;

  procedure TweenPolhemus (polhm: polhmSerPtr);
{ go through all of recorded data.  For each pohlemus slot, average the values }
{ between each change to be the slope of the change.  This only works on uncompressed }
{ raw data.  If it was compressed the memory would have to be expanded. }
   type
     memRecPtr = ^memRec;
     memRec = record
         jiffy:  longint;
         slots: array[rawDataIndex]  of  integer;
       end;
   var
     endptr:  Ptr;
     lp, lastPtr, crnt:  memRecPtr;
     i, j, first, Size, inc, tween: integer;
  begin
    if polhm^.serBlock.dar.state = DAon then
      begin
        Announce('Tweening Pohlemus...');
        endptr := Pointer(ord4(StripAddress(recBuffH^)) + recordedSize - recnum - 4);
        crnt  := memRecPtr(StripAddress(recBuffH^));
        first  := polhm^.serBlock.dar.FirstSlot;
        size := polhm^.serBlock.dar.size - 1;
        while ord4(crnt) < ord4(endptr) do
          begin
            inc := 0;
            lastPtr  := crnt;                          { Save the initial configuration }
            repeat                                    { repeat until we have a change. }
              crnt := pointer(ord4(crnt) + recNum + 4);
              inc := inc + 1;
            until  (crnt^.slots[first]  <>  lastPtr^.slots[first])  or  (crnt^.slots[first  +  1]  <>  lastPtr^.slots[first
          + 1]);
            if (ord4(crnt)  <  ord4(endptr))  and  (inc > 1) then
              begin  { tween all the records between lastptr and lp (current ptr) }
                lp  := lastPtr;
                for i := 1 to inc - 1 do
                  begin
                    lp := pointer(ord4(lp) + recNum + 4);  { inc to next tween array }
                    for j := first to first + size do
                      begin
                        tween := round(((crnt^.slots[j]  -  lastPtr^.slots[j])  /  inc)  *  i);
                        lp^.slots[j]  :=  lastPtr^.slots[j]  +  tween;
                      end;
                  end;
              end;
```

```
      end;
     Announce('Tween done.');
    end;            { if pohlemus on. }
  end;              { TweenPolhemus }

  procedure ChangeRecRaw; { (newState : boolean) }
{ Change the state of recording raw data to newState.  If it is already newState }
{ then don't do anything. }
   var
    sec, hz: real;
    blkSize, l, frames: longint;
  begin
   if newState <> RecRawOn then
    begin
     recNum := (RawDesc.numUsed + 1) * 2;
     if recBuffH = nil then
      begin
       l := recNum * 30;                   { bytes per sec used. }
       blkSize := MaxBlock div 2;
       if blkSize > (l * 600) then         { if more than 10 min }
        blkSize := (l * 600);              { then just grab 10 min. }
       recBuffH := NewHandle(blkSize);
       l := blkSize div l;                 { l = num of seconds. }
       if recBuffH <> nil then
        Announce(StringOf('Buffer opened for ', l div 60 : 1, ' minutes, ', l mod 60 : 1, ' seconds at
      30hz.'));
      end;
     if recBuffH = nil then
      begin
       AnnounceB('Not enough memory for record buffer!');
      end
     else
      begin
       if newState then {Set Recording ON and do setup}
        begin
         reclooped := false;
         HLock(recBuffH);
         recPtr := recBuffH^;
         recEndPtr := pointer(ord4(recPtr) + GetHandleSize(RecBuffH));
         RecRawOn := true;
         PlayRawOn := false;
         PlaySubLoopOn := false;
         CounterOn := false;
         RewindOn := false;
         FastForwardOn := false;
         DispFFOn := false;
         DispRewOn := false;
         if cycleDAR.state = DAon then                { If cycler on do this so it will reset the
      inc }
          if cycleDA(resetDA, cycleDAR) <> 0 then     { count. }
           ;
         Announce('Recording on....');
         recJiffy := Ticks^;
```

```
            LastRecJiff := Ticks^ - 2;
          end
        else {Stop Recording}
          begin
            recordedSize := ord4(recPtr) - ord4(recBuffH^);
            HUnlock(recBuffH);
            RecRawOn := false;
            sec := (LastRecJiff - recJiffy) / 60;
            frames := recordedSize div (RecNum + 4);
            hz := frames / sec;
            Announce(StringOf('Recording off, ', frames : 1, ' frames recorded in ', sec : 2 : 2, ' seconds.
      Average ', hz : 1 : 1, ' hz. '));
{$ifc 0 }
            if not optionisdown then
              TweenPolhemus;
{$endc }
          end;
        end;
    end;
    SetRecPlayMenu;
  end;        { ChangeRecRaw }

  procedure ChangePlayRaw; { (newState : boolean) }
{ Change the state of playing raw data to newState.  If it is already newState }
{ then don't do anything. }
    var
      err:  integer;
  begin
    if newState <> PlayRawOn then
      begin
        if (recBuffH = nil) or (recordedSize = 0) then
          AnnounceB('No raw data has been recorded!')
        else if newState then
          begin   { turn playing on }
            HLock(recBuffH);
            playPtr := recBuffH^;
            if reclooped = true then
              playPtr := pointer(ord4(playPtr) + recordedSize + 4);    {+4?}
            playEndPtr := pointer(ord4(playPtr) + recordedSize - recnum - 4);
            RecRawOn := false;
            PlayRawOn := true;
            Announce('Raw playback on...');
            playJiffy := Ticks^;
          end
        else
          begin   { turn playing off. }
            HUnlock(recBuffH);
            PlayRawOn := false;
            Announce('Raw playback off...');
            err := postevent(app1Evt, RawPlayOffMsg); { Brodcast play off. }
          end;
      end;
    SetRecPlayMenu;
```

```
 end;        { ChangePlayRaw }

 procedure DataAcquisition;
{ This gets called as often as possible from the main loop.  All the data Acquisition }
{ and filling of the rawData array gets done here. }
   var
     i, count: integer;

   procedure doPlay;
   { PlayBack raw is on.  Put a new raw data record into the rawData array. }
     type
       longPtr = ^LongInt;
     var
       lp: LongPtr;
       l: longInt;
   begin
     lp := LongPtr(playPtr);
     if reclooped = true then
       begin
{•     while (lp^ < Ticks^ - playJiffy) and (ord4(lp) < ord4(recEndPtr)) do •}
         lp := pointer(ord4(lp) + recNum + 4);
         playPtr := pointer(lp);
         if ord4(playPtr) < ord4(recEndPtr) then
           begin
             BlockMove(pointer(ord4(lp) + 4), @rawData, recNum);
             dispcount := lp^;
             rawTick := lp^;
           end
         else
           playPtr := recBuffH^;
         playjiffy := Ticks^;
       end
     else  {reclooped=false}
       begin
{•     while (lp^ < Ticks^ - playJiffy) and (ord4(lp) < ord4(recEndPtr)) do •}
         lp := pointer(ord4(lp) + recNum + 4);
         playPtr := pointer(lp);
         if ord4(playPtr) < ord4(playEndPtr) then
           begin
             BlockMove(pointer(ord4(lp) + 4), @rawData, recNum);
             dispcount := lp^;
             rawTick := lp^;
           end
         else if not loop then
           begin     { play has come to the end of the buffer.  stop play and tell dm. }
             ChangePlayRaw(false);
           end
         else
           begin
             playPtr := recBuffH^;
             playJiffy := Ticks^;
           end;
       end;
```

```
end;  {doPlay}


procedure doRecord;
{ Recording of raw data is on.  Save the current rawData array. }
 type
  longPtr = ^LongInt;
 var
  lp: LongPtr;
begin
 if hz30 then
  while Ticks^ < LastRecJiff + 2 do
   ;
 lp := LongPtr(recPtr);
 lp^ := Ticks^ - recJiffy;
 LastRecJiff := Ticks^;
 recPtr := pointer(ord4(lp) + recNum + 4);      { find where next record goes. }
 if ord4(recPtr) >= ord4(recEndPtr) then        { ack! past end of buffer }
  if not loop then
   ChangeRecRaw(false)  { turn recording of raw off. }
  else
   begin
    lp := LongPtr(recBuffH^);
    recPtr := pointer(ord4(lp) + recNum + 4);
    reclooped := true;
    BlockMove(@rawData, pointer(ord4(lp) + 4), recNum);
   end
 else
  BlockMove(@rawData, pointer(ord4(lp) + 4), recNum);
end;      { doRecord }


procedure DoPlaySubLoop;
{ PlaySubLoop is on.  Ask For Parameters and loop within these limits. }
 type
  longPtr = ^LongInt;
 var
  lp: LongPtr;
  start, stop, l: longInt;
begin
 lp := LongPtr(playPtr);
 if reclooped = true then
  begin
{•  while (lp^ < Ticks^ - playJiffy) and (ord4(lp) < ord4(recEndPtr)) do •}
    lp := pointer(ord4(lp) + recNum + 4);
    playPtr := pointer(lp);
    if ord4(playPtr) < ord4(recEndPtr) then
     BlockMove(pointer(ord4(lp) + 4), @rawData, recNum)
    else
     playPtr := recBuffH^;
    playjiffy := Ticks^;
  end
 else  {reclooped=false}
```

```
      begin
{•    while (lp^ < Ticks^ - playJiffy) and (ord4(lp) < ord4(recEndPtr)) do •}
        lp := pointer(ord4(lp) + recNum + 4);
        playPtr := pointer(lp);
        if ord4(playPtr) < ord4(playEndPtr) then
          begin
            BlockMove(pointer(ord4(lp) + 4), @rawData, recNum);
            dispcount := lp^;
          end
        else
          begin
            playPtr := playStartPtr;
            playJiffy := Ticks^ - slStart - 10;
          end;
      end;
  end;  {doPlaySubLoop}

  procedure SingleIdle;
  { This is real kludgy.  It idles waiting for a keyboard input.  If the input is }
  { '*' then it turns SingleStep off.  Otherwise it just returns. }
    var
      event: EventRecord;
      letgo: boolean;
      ch: char;
  begin
    letgo := false;
    repeat
      if GetNextEvent(keyDownMask, event) then
        begin
          letgo := true;
          ch := chr(BitAnd(event.message, $FF));
          if ch = '*' then
            SingleStep := false;
        end;
    until letgo;
  end;

  procedure ShowCounter;
    var
      l: longInt;
  begin
    l := (ord4(playPtr) - ord4(recBuffH^)) div (recNum + 4);
    Announce(StringOf(ntos(l), '   ', ntos(dispcount)));
  end; {Showcounter}


  procedure TurnOff (var dar: DARec);
    var
      i: integer;
  begin     { This DA errored.  turn it off and set all its values to $FFFF. }
    dar.state := DAoff;
    for i := 0 to dar.Size - 1 do
      rawData[dar.firstSlot + i] := -1;
```

```
  end;

begin
  if (PlayRawOn or PlaySubLoopOn) then
    begin
      if counterOn then
        showCounter;
      if SingleStep then
        SingleIdle;
    end;
  if PlayRawOn then
    doPlay
  else if PlaySubLoopOn then
    doPlaySubLoop
{else if DispRewOn then}
{doDispRewOn}
{else if DispFFOn then}
{doDispFFOn}
  else
    begin  { do data Acquisition }
      rawTick := Ticks^ - recJiffy;

      for count := 1 to numGloves do
        if gBoxes[count] <> nil then
          if gBoxes[count]^.serBlock.dar.state = DAon then      {[count]}
            if GBIIBox(gBoxes[count], readDA) <> 0 then
              turnOff(gBoxes[count]^.serBlock.dar);

      for count := 1 to numPolhms do
        if polhms[count]^.serBlock.dar.state = DAon then
          if PolDA(polhms[count], readDA) <> 0 then
            turnoff(polhms[count]^.SerBlock.dar);

      if cycleDAR.state = DAon then
        if cycleDA(readDA, cycleDAR) <> 0 then
          turnOff(cycleDAR);
      if flashDAR.state = DAon then
        if flashDA(readDA, flashDAR) <> 0 then
          turnOff(flashDAR);
      if timeDAR.state = DAon then
        if timeDA(readDA, timeDAR) <> 0 then
          turnOff(timeDAR);
      if adiosDAR.state = DAon then
        if MacADIOSDA(readDA, adiosDAR) <> 0 then
          turnOff(adiosDAR);
    end;
  if RecRawOn then
    doRecord;
  RawText;    { Update the text display }
end;

procedure ChangePlaySubLoop;
  type
```

```
      longPtr = ^LongInt;
    var
      lp: LongPtr;
      l: longInt;
  begin
    lp := LongPtr(recbuffH^);
    if not PlaySubLoopOn then
      begin
        showtext;
        writeln('enter the upper boundary of the subloop  ');
        readln(slStart);
        writeln('enter the lower boundary of the subloop  ');
        readln(slEnd);
        HLock(recBuffH);
        playPtr := recBuffH^;
        if reclooped = true then { THIS CODE is not WRITTEN}
          begin
            playStartPtr := pointer(ord4(playPtr) + Recordedsize + slStart + 4);{+4?}
            playEndPtr := pointer(ord4(playPtr) + slEnd);  {MAY BE WRONG}
          end
        else
          begin
            lp := longPtr(recbuffH^); {reset lp}
            while (lp^ < slStart) and (ord4(lp) < ord4(recEndPtr)) do
              lp := pointer(ord4(lp) + recNum + 4);
            playStartPtr := pointer(lp);
            if (ord4(playStartPtr) > ord4(recEndPtr)) then
              writeln('first value out of range');
            lp := longPtr(recbuffH^); {reset lp}
            while (lp^ < slEnd) and (ord4(lp) < ord4(recEndPtr)) do
              lp := pointer(ord4(lp) + recNum + 4);
            playEndPtr := pointer(lp);
            if (ord4(playEndPtr) > ord4(recEndPtr)) then
              writeln('second value out of range');
          end;
        playPtr := PlayStartPtr;
        RecRawOn := false;
        PlayRawOn := false;
        PlaySubloopOn := true;
        RewindOn := false;
        DispFFOn := false;
        DispRewOn := false;
        Announce('Playing selected subloop...');
        playJiffy := Ticks^ - slstart - 10;
      end
    else {Subloopinited = true}
      begin { turn playing off. }
        HUnlock(recBuffH);
        PlaySubloopOn := false;
        Announce('Subloop Halted by Your Command...');
        counterOn := false;
        dispcount := 0;
      end;
```

```
   SetRecPlayMenu;
 end;        { ChangePlaySubLoop }


 procedure ChangeRewind; {move the playPtr to the desired spot}

   type
     longPtr = ^LongInt;
   var
     lp: LongPtr;
     l: longInt;
 begin
   lp := LongPtr(recBuffH^);
   showtext;
   writeln('Please enter the offset value that you lust for');
   readln(slStart);
   while (lp^ < slStart) and (ord4(lp) < ord4(recEndPtr)) do
     lp := pointer(ord4(lp) + recNum + 4);
   playPtr := pointer(lp);
   if ord4(playPtr) >= ord4(recEndPtr) then
     begin
       showtext;
       writeln('So Sorry, but this value is out of range');
     end;
   dispcount := lp^;
   RecRawOn := false;
   RewindOn := true;
   DispFFOn := false;
   DispRewOn := false;
   Announce('It is Done.');
   playJiffy := Ticks^ - slStart - 10;
 end;        { ChangeRewind }


 procedure ChangeCounter; {turn the counter display On}
 begin
   if CounterOn then
     begin
       Announce('Counter Turned Off.');
       counterOn := false;
     end
   else
     begin
       Announce('Counter Turned On.');
       counterOn := true;
       dispcount := 0;
     end;
 end;

 procedure TogRawDisp;
   { Toggle showing the raw display from decimal to hex. }
 begin
   RawDesc.dispHex := not RawDesc.dispHex;
```

```
   CheckItem(DAMHndl, TogDecItem, not RawDesc.dispHex);
  end;

  function PutRawDataGlob: integer;        { **cb** }
{ Put the recorded raw data into the current resource file.  return any errors }
{ encountered in trying to do this. }
   var
    i, err: integer;
    globHandle: RDfileGlobHandle;
  begin
   globHandle := RDfileGlobHandle(Get1Resource(RDGlobType, 0));
   err := ResError;
   if (globHandle = nil) then
     begin
      globHandle := RDfileGlobHandle(NewHandle(sizeof(RDfileGlobType)));
      err := MemError;
      if err = noErr then
        begin
         AddResource(Handle(globHandle), RDGlobType, 0, 'Raw Data globals');
         err := ResError;
        end;
     end;
    if err = noErr then
     begin
      with globHandle^^ do
        begin
         version := RDVersion;
         recSize := recNum;
         for i := 0 to maxRawData do
           SavedNames[i] := RawDataDef[i].name;
        end;
      ChangedResource(Handle(GlobHandle));
      UpdateResFile(CurResFile);
      err := ResError;
      DetachResource(Handle(GlobHandle));
      DisposHandle(Handle(GlobHandle));
     end;
    PutRawDataGlob := err;
   end;

   procedure SaveRecRaw;        { **cb** }
  { If there is raw data to save then get a filename from the user.  If the user }
  { supplies a filename and the resource manager can create/open it the call }
  { PutRawData to put the raw data into the file. }
     var
      i, ResNum, err, oldVref, vRef, refNum: integer;
      Name: str255;
      fndrInfo: FInfo;
      count: longInt;
    begin
     err := 0;
     if (recBuffH = nil) or (recordedSize = 0) then
       AnnounceB('No raw data to save.')
```

```
else
  begin
    NewFileIdent(Name, vRef, 'rawData', 'Save raw data as?');
    if Name <> '' then
      begin
        err := FSOpen(Name, vRef, refNum);
        if err = fnfErr then
          begin
            err := Create(name, vRef, AppType, RDFileType);
            if err = NoErr then
              err := FSOpen(Name, vRef, refNum);
          end;
        if err = NoErr then
          begin
            count := recordedSize;
            err := FSWrite(refNum, count, recBuffH^);
            i := FSClose(refNum);
          end;
        if err = NoErr then
          begin
            err := GetVol(nil, oldVref);
            err := SetVol(nil, vRef);
            if err = noErr then
              begin
                CreateResFile(Name);
                ResNum := OpenResFile(Name);
                if ResNum < 0 then
                  err := ResError
                else
                  begin
                    err := PutRawDataGlob;
                    CloseResFile(ResNum);
                    if err <> NoErr then        { Put didn't work, delete the file. }
                      i := FSDelete(Name, vRef)
                    else
                      begin
                        err := GetFInfo(Name, vRef, fndrInfo);
                        if err = 0 then
                          begin
                            fndrInfo.fdType := RDFileType;
                            fndrInfo.fdCreator := AppType;
                            err := SetFInfo(Name, vRef, fndrInfo);
                          end;    { if GetFInfo worked. }
                      end;        { if opened resource file }
                  end;            { if set volume }
              end;
            err := SetVol(nil, oldVref);
          end;            { if data was written out OK. }
      end;              { if user supplied filename }
  end;                  { if something to save. }
if err <> 0 then
  AnnounceB(StringOf('Save record failed.  Error ', err : 1));
end;      { SaveRecRaw }
```

```
procedure OpenRecRaw;       { **cb** }
 type
   JiffInts_Type = record
       jiffy: longInt;
       ints: array[rawDataIndex] of integer;
     end;
 var
   i, ResNum, err, oldVref, vRef, refNum, {}
   transform,                   { transform type, 0 = copy file, 1 or 2 = pull individual words. }
   fileIntSize: integer;        { the file has 0..fileIntSize-1 entries in a record. }
   Name: str255;
   fndrInfo: FInfo;
   TList: SFTypeList;
   count: LongInt;
   TransFormAr: array[rawDataIndex] of integer;
   temp: JiffInts_Type;
   recArrayPtr: ^JiffInts_Type;

 function CheckRawDataGlob: integer;
     { Check the currently installed raw data array against the RawData global info that was saved }
     { in this rawData file. If they match perfectly then return 0, if they don't match but a }
     { transformation array can be made then return 1, if a transformation array can be }
     { made but it will loose some info then return 2, else if you get file or resource errors }
     { then return the error. (all errors are negative). If a transformation array is created }
     { it is left in the global variable TransFormAr[]. }
     { CLB 10/3/89 - If info would be lost then prompt the user what to do. If the user wants to }
     { just run the recorded data then turn off all the DA's and reconfigure the raw data array to}
     { to have the correct names. }
   var
     i, err: integer;
     globHandle: RDfileGlobHandle;
     match, mapping: boolean;

   function TurnOffDAs (origErr: integer): integer;
     var
       i, item: integer;
       origDAconfig: DAconfigRec;

   begin
     ParamText('Raw data doesn''t match the DA''s.  Turn off DA''s?', '', '', '');
     item := CautionAlert(YesNoID, nil);
     case item of
       1: { Yes }
         begin
           CloseDataAq;
           InitRaw;
           origDAconfig := DAconfig;
           with DAconfig do
             begin
               Bits := Bits * [midiBit, HostBit];     { Only allow the midi or host to be on. }
               serialConfig := [];
             end;
```

```
          reInitDataAq;
          DAconfig := origDAconfig;
          HLock(Handle(globHandle));
          with globHandle^^ do
            begin
              i := AllocateRaw('Recorded', recSize div 2);
              for i := 0 to (recSize div 2) - 1 do
                rawDataDef[i].name := SavedNames[i];
            end;
          HookupFlag := true;     { Signal that DM's need to be rehooked up. }
          HUnlock(Handle(globHandle));
          TurnOffDAs := noErr;
        end;
      2: { No }
        TurnOffDAs := origErr;
      3: { Cancel }
        TurnOffDAs := -1023;
    end;
  end;

begin
  globHandle := RDfileGlobHandle(Get1Resource(RDGlobType, 0));
  if globHandle = nil then
    begin
      CheckRawDataGlob := ResError;
      exit(CheckRawDataGlob);
    end;

  with globHandle^^ do
    begin
      if version <> RDVersion then
        begin
          Announce('Old version RawData file, can''t read.');
          err := -1023;
        end
      else
        begin
          match := true;
          mapping := true;
          fileIntSize := (recSize div 2);
          for i := 0 to fileIntSize - 1 do
            begin
              TransFormAr[i] := FindRaw(SavedNames[i], nil);
              if i <> TransFormAr[i] then
                match := false;
              if TransFormAr[i] < 0 then
                mapping := false;
            end;
          if match and (recSize = (RawDesc.numUsed + 1) * 2) then
            err := noErr      { names match and size the same, Identical arrays. }
          else
            begin
              if mapping then
```

```
              err := 1              { can be mapped to different locations }
            else
              begin
                err := TurnOffDAs(2); { can map but will loose data. }
              end;
          end;
        end;
      end;
    ReleaseResource(Handle(globHandle));
    CheckRawDataGlob := err;
  end;

begin
  TList[0] := RDFileType;
  OldFileIdent(Name, vRef, 'Open what raw?', 1, TList);
  if Name <> '' then
    begin
      err := GetVol(nil, oldVref);
      err := SetVol(nil, vRef);
      if err = noErr then
        begin
          ResNum := OpenResFile(Name);
          err := ResError;
        end;
      if err = noErr then
        begin
          err := CheckRawDataGlob;
          if err >= 0 then
            begin
              transform := err;
              err := noErr;
            end
          else if err = noErr then
            transform := 0;
          CloseResFile(ResNum);
          if err = noErr then
            begin
              ChangeRecRaw(true);
              if RecRawOn then
                begin
                  ChangeRecRaw(false);
                  err := FSOpen(Name, vRef, refNum);
                  case transform of
                    0:
                      begin
                        Announce('Saved data idenical to RawData array.  Loading as is.');
                        count := GetHandleSize(recBuffH);
                        if err = NoErr then
                          begin
                            err := FSRead(refNum, count, recBuffH^);
                            recordedSize := count;
                          end;
                      end;
```

```
              1, 2:
                begin
                  if transform = 1 then
                    Announce('Saved data different from RawData array, loading and translating.')
                  else
                    Announce('Not all the saved data names could be matched up.  Loading and
translating what I can.');
                  recArrayPtr := Pointer(recBuffH^);
                  repeat
                    count := fileIntSize * 2 + 4;
                    err := FSRead(refNum, count, @temp);
                    if (err <> noErr) or (count <> fileIntSize * 2 + 4) then
                      leave;
                    for i := 0 to RawDesc.numUsed do
                      recArrayPtr^.ints[i] := -1;
                    recArrayPtr^.jiffy := temp.jiffy;
                    for i := 0 to fileIntSize - 1 do
                      if TransFormAr[i] >= 0 then
                        recArrayPtr^.ints[TransFormAr[i]] := temp.ints[i];
                    recArrayPtr := Pointer(ord4(recArrayPtr) + recNum + 4);
                  until false;
                  recordedSize := ord4(recArrayPtr) - ord4(recBuffH^);
                end;
            end; { case }
          end;
        i := FSClose(refNum);
      end;
    end;
    if (err <> noErr) and (err <> eofErr) then
      Announce(StringOf('Open Raw file error # ', err : 1, '.'));
  end;         { if user choose file. }
end;      { OpenRecRaw }

procedure doDAMenu;     { **cb** }
{ Handle menu events for the 'DA' menu. }
begin
  case Item_No of
    OpenRItem:   { Open Raw }
      OpenRecRaw;
    SaveRItem:   { Save Raw }
      SaveRecRaw;
    RecRItem:
      ChangeRecRaw(not RecRawOn);
    PlayRItem:
      ChangePlayRaw(not PlayRawOn);
    ResetDAItem:
      ResetAllDAs;
    TogDecItem:
      TogRawDisp;
    otherwise
      sysbeep(3);
  end;      { case }
end;  { doDAMenu }
```

```
  procedure LoopKey;    {(val:char)}
{ handle keyboard input when the raw window is front. }
    var
      str: string;
      i: integer;
  begin
    if not turnKey then
      case val of
{$ifc false }
        's':
          ChangePlaySubloop;
        'c':
          ChangeCounter;
        'r':
          ChangeRewind;
{$endc }
{$ifc Debug }
        'å':        { option - a }
          begin
            AliasEdit := not AliasEdit;
            Announce(StringOf('AlisasEdit is now ', AliasEdit, '.'));
          end;
        'a':
          if AliasEdit then
            begin
              RemoveAliases(false);
              InstallAliases(false);
            end;
        's':
          if AliasEdit then
            begin
              RemoveAliases(false);
              InstallAliases(true);
            end;
        'r':
          if AliasEdit then
            RemoveAliases(false);
{$endc }
        '*':
          begin
            SingleStep := true;
            Announce('Single Step is on.  Another "*" turns it off.');
          end;
        '^':        { **cb** }
          begin  { show current status. }
            str := StringOf('Bytes Recorded: ', recordedSize : 1, ' Rec Size: ', recNum : 1);
            str := StringOf(str, ' BuffSize: ', GetHandleSize(recBuffH) : 1);
            Announce(str);
{$ifc Debug }
            if AliasSize > 0 then
              begin
                Announce('AliasList: original - alias.');
```

```
            for i := 1 to AliasSize do
              Announce(concat(AliasH^^[i].orig, ' - ', AliasH^^[i].alias));
           end;
{$endc }
        end;
{    'F' : }
{   ChangeDispFF;}
{    'R' : }
{   ChangeDispRew;}
       '?':
        begin
          Announce('' - Single step, ` - Show status.');
{$ifc Debug }
          Announce('opt a - Edit Aliases, a - Install, r - Remove, s - Show aliases.');
{$endc }
        end;
      otherwise
        SysBeep(3);
    end;
  end;

end.
```

```
{ This is a colection of DA's made by chuck.  They are mostly here so he can }
{ test out the rest of the code without having to have any I/O hooked up. }

unit DataFlash;
interface
  uses
    iop_calls, chuckstuff, AutoLib, Globals, FastStuff, MiscRoutines, RawUnit;

  var
    flashDAR: DARec;

  procedure menuWriteDF (ident: integer);
  procedure menuReadDF (ident: integer);
  function FlashDA (v: DAverb; var dar: DARec): integer;

implementation

  type
    { CardConfig below defines what to read from the dataflash. }
    {   multiplex - as sent to Whitney.  Reads card F straight and multiplexes card E. }
    {   justE - Reads just 32 channels from card E.  }
    {   justF - !!! doesn't work because CodeStrF writes to $E040 but blockread is from $E000. }
    {   EandF - Reads 64 channels from both card E and F.  E comes first. }

    CardType = (multiplex, justE, justF, EandF);

  const
    Code_Addr = $C000;        { DataFlash Addr to load Z-80 code to. }
    iop_mem_addr = $E000;     { DataFlash Addr that the Z-80 code writes values to. }

  var
    CardConfig: CardType;  { how the DataFlash is populated.  See above. }
    readSize: integer;     { Number of slots for this config of the dataflash. }

  procedure menuWriteDF; { (ident : integer) }
    var   { Get input from the user, then write value to DataFlash port. }
      prompt1, str1, str2: str255;
      port, value, i: integer;
  begin
    prompt1 := concat('Write a byte out a DataFlash port.');
    prompt1 := concat(prompt1, chr(13), 'Enter the DataFlash output port (in Hex):');
    str1 := '';
    str2 := '';
    if GetStrings(prompt1, 'And the byte to write (in Hex):', str1, str2) then
      if (str1 <> '') and (str2 <> '') then
        if (length(str1) <= 2) and (length(str2) <= 2) then
          begin
            port := 0;
            StuffHex(ptr(ord4(@port) + 1), str1);
            value := 0;
            StuffHex(ptr(ord4(@value) + 1), str2);
            port := minMaxOf(0, port, 255);
            value := minMaxOf(0, value, 255);
```

```
      i := Write_io_port(port, value);
      if i <> noErr then
        AnnounceB(StringOf('DataFlash error ', i : 1));
    end;
end;      { menuDFWrite }

procedure menuReadDF; { (ident : integer) }
  var  { Get input from the user, then write value to DataFlash port. }
    prompt1, str1, str2: str255;
    port, value: byte;
    i: integer;
begin
  prompt1 := concat('Read a byte from a DataFlash port.');
  prompt1 := concat(prompt1, chr(13), 'Enter the DataFlash input port (in Hex):');
  str1 := '';
  str2 := '';
  if GetStrings(prompt1, '', str1, str2) then
    if (str1 <> '') and (length(str1) <= 2) then
      begin
        port := 0;
        StuffHex(ptr(ord4(@port) + 1), str1);
        port := minMaxOf(0, port, 255);
        str2 := copy(AHexWord(port), 3, 2);
        i := Read_io_port(port, value);
        if i = noErr then
          Announce(StringOf('DataFlash input $', str2, ' = ', value : 1, '.'))
        else
          AnnounceB(StringOf('DataFlash error ', i : 1));
      end;
end;      { menuReadDF }

procedure menuMemWrite (ident: integer);
  var  { Get input from the user, then write value to DataFlash port. }
    prompt1, str1, str2: str255;
    addr, err, count: integer;
    bytes: packed array[0..100] of Byte;
begin
  prompt1 := concat('Write a byte out a DataFlash port.');
  prompt1 := concat(prompt1, chr(13), 'Enter the DataFlash mem addr (in Hex):');
  str1 := '';
  str2 := '';
  if GetStrings(prompt1, 'And the bytes to write (in Hex):', str1, str2) then
    if (str1 <> '') and (str2 <> '') then
      if (length(str1) <= 4) and (length(str2) <> 0) then
        begin
          addr := 0;
          StuffHex(@addr, str1);
          StuffHex(@bytes, str2);
          count := length(str2) div 2;
          Announce(stringof('Writing ', count : 1, ' bytes to ', HexWord(addr), '.'));
          err := Write_iop_memory(addr, @bytes, count);
          if err <> noErr then
            AnnounceB(StringOf('DataFlash error ', err : 1));
```

```
      end;
  end;        { menuMemWrite }

  procedure menuMemRead (ident: integer);
    var  { Get input from the user, then write value to DataFlash port. }
      prompt1, str1, str2: str255;
      addr, count: longInt;
      i, err: integer;
      bytes: packed array[0..100] of Byte;
  begin
    prompt1 := concat('Read bytes from the DataFlash memory.');
    prompt1 := concat(prompt1, chr(13), 'Enter the DataFlash mem to read (in Hex):');
    str1 := '';
    str2 := '';
    if GetStrings(prompt1, 'And # of bytes to read (decimal)?', str1, str2) then
      if (str1 <> '') and (str2 <> '') then
        if (length(str1) <= 4) then
          begin
            addr := 0;
            StuffHex(@addr, str1);
            StringtoNum(str2, count);
            err := Read_iop_memory(addr, @bytes, count);
            if err = noErr then
              begin
                str2 := 'Bytes back = ';
                for i := 0 to count - 1 do
                  begin
                    str2 := concat(str2, HexByte(bytes[i]));
                  end;
                Announce(str2);
              end
            else
              AnnounceB(StringOf('DataFlash error ', err : 1));
          end;
  end;        { menuMemRead }

{ This is just a slow way to test the dataflash. It just reads 32 ports from CardE }
{ and writes to the first 32 dataflash slots. It does this without using any Z-80 code,}
{ just io_port read and writes. }
  function readPorts (pointsto: IntPtr): integer;
    var
      i, err, port, value: integer;
      b, b1: byte;
  begin
    err := noErr;
    for i := 0 to 31 do
      if err = noErr then
        begin
          err := Write_io_port($eb, i);    { start conversion. }
          if err = noErr then
            begin
              repeat
                err := Read_io_port($ed, b);
```

```
          until (BitAnd(b, $80) = 0) or (err <> noErr);
          if err = noErr then
            err := Read_io_port($ed, b);
          if err = noErr then
            err := Read_io_port($ec, b1);
          if err = noErr then
            begin
              value := b1 + b * 256;
              pointsto^ := value;
              pointsto := Pointer(ord4(pointsto) + 2);
            end;
        end;
    end;
  readPorts := err;
end;

{ This is the DataFlash Data Acquisition module.  It reads the A/D's in the SCSI DataFlash card cage. }
 function FlashDA; {  (v : DAverb; var dar : DARec) : integer }

   var
     i, err: integer;
     str: string;
     t: longint;

   function InitFlash: integer;
{ This version initializes the DataFlash based on the constant CardConfig.  See the definition of }
{ CardConfig at the beginning of this unit for more info. }

     const
       codeRes = 'z80 ';    { Resource type for the z80 code that does multiplexing. }
     var
       Z80Code: packed array[1..512] of Byte;
       err: integer;
       CodeStrE, CodeStrF, CodeStr: str255;
       h: handle;
   begin
     if DF_MultiBit in DAconfig.bits then
       CardConfig := multiplex
     else if DF_EandFBit in DAconfig.bits then
       CardConfig := EandF
     else
       CardConfig := justE;

     CodeStrE := '2100E00EEB0620783DED79DBEDE68020FADBED7723DBEC772310ECC9';
     CodeStrF := '2140E00EfB0620783DED79DBfDE68020FADBfD7723DBfC772310ECC9';
   { Configure the dataflash based on CardConfig.  multiplex is the code written for}
   { whitney, or you can read card E, card F or both. }
     case CardConfig of
       multiplex:
         readSize := 66;
       justE:
         begin
           readSize := 32;
```

```
          CodeStr := CodeStrE;
        end;
      justF:
        begin
          readSize := 32;
          CodeStr := CodeStrF;
        end;
      EandF:
        begin
          readSize := 64;
          { CodeStr := read E without return at the end. }
          CodeStr := copy(CodeStrE, 1, length(CodeStrE) - 2);
          CodeStr := concat(CodeStr, CodeStrF);
        end;
    end;
    if CardConfig = multiplex then
      begin    { reads card E and card F and mutiplexes card E.  (as sent to whitney) }
        h := GetResource(codeRes, 0);
        err := MemError;
        if err = 0 then
          err := Write_iop_memory(Code_Addr, h^, GetHandleSize(h));
      end
    else
      begin
        StuffHex(@Z80Code, CodeStr);
        err := Write_iop_memory(Code_Addr, @Z80Code, length(CodeStr) div 2);
      end;
    if err <> noErr then
      begin
        sysbeep(2);
        if err = 2 then
          Announce('The DataFlash isn''t responding.')
        else
          Announce(StringOf('Error in DataFlash Initialization:, ', err : 1));
      end;
    InitFlash := err;
  end;

begin
  case v of
    initDA:
      begin
        dar.Private := nil;
        err := InitFlash;
        dar.name := 'Flash';
        dar.Size := readSize;
        dar.FirstSlot := AllocateRaw(dar.name, dar.Size);
        if dar.FirstSlot <> -1 then
          begin
            dar.ptrto := @RawData[dar.FirstSlot];
            FlashDA := 0;
            i := dyNewItem(DAMHndl, '(-', @menuReadDF, true);
            i := dyNewItem(DAMHndl, 'Write DataFlash Port', @menuWriteDF, true);
```

```
        i := dyNewItem(DAMHndl, 'Read DataFlash Port', @menuReadDF, true);
        i := dyNewItem(DAMHndl, 'Write DataFlash Memory', @menuMemWrite, true);
        i := dyNewItem(DAMHndl, 'Read DataFlash Memory', @menuMemRead, true);
      { Set the Dataflash slot names based on the card config. }
        case CardConfig of
          justE, justF:
            begin { Change order of the names to be 32..1 }
              if CardConfig = justE then
                str := 'FlashE'
              else
                str := 'FlashF';
              for i := 0 to readSize - 1 do
                rawDataDef[dar.FirstSlot + i].name := StringOf(str, (readSize - 1) - i : 1);
            end;
          EandF:
            begin
              for i := 0 to 31 do
                rawDataDef[dar.FirstSlot + i].name := StringOf('FlashE', (readSize - 32 - 1) - i : 1);
              for i := 32 to readSize - 1 do
                rawDataDef[dar.FirstSlot + i].name := StringOf('FlashF', (readSize - 1) - i : 1);
            end;
          multiplex:
            begin
              for i := 0 to readSize - 1 do
                begin
                  if i < 32 then
                    begin
                      str := 'DFaJ';
                      str := concat(str, chr(((readSize - 2 - (i + 1)) div 8 mod 4) + ord('1')));
                      str := concat(str, chr((readSize - 2 - (i + 1)) mod 8 + 48));
                    end
                  else if i < 32 + 18 then
                    str := stringof('DFGlvA', 17 - (i - 32) : 1)
                  else
                    str := stringof('DFGlvB', 15 - (i - 32 - 18) : 1);
                  rawDataDef[dar.FirstSlot + i].name := str;
                end;
            end;     { multiplex }
        end;         { case CardConfig }
      end
    else
      FlashDA := -1;
  end;
ReadDA:
  with dar do
    begin
      if false then
        begin
          err := readPorts(ptrto);
          if err <> noErr then
            Announce(StringOf('DataFlash readPorts error #', err : 1))
        end
      else
```

```
            begin
              err := Read_iop_memory(iop_mem_addr, Ptr(ptrto), readSize * 2);
              if err <> noErr then
                Announce(StringOf('DataFlash read memory error #', err : 1))
              else if true then
                begin
                  err := Branch(Code_Addr);
                  if err <> noErr then
                    Announce(stringof('Dataflash branch error #', err : 1));
                end;
            end;
          FlashDA := err;
        end;
    otherwise
      FlashDA := 0;
  end;      { Case }
end;    { FlashDA }

end.
```

```
{ This unit handles translation of raw data into direct tree manipulations. }
{ IA Data Massage module is the data structure that describes the }
{ inputs, outputs and type of code that operates on the module. }

{ To add a new Data Massage type: }
{ 1. Write a handler routine like HandleScale. (SomeDMs.pas) }
{ 2. Add a DM module type in DMType at the end of the list. (DMTypes.pas) }
{ 3. Add the handler routine to the case statement in doVerb. (HandleDMs.pas }
{ 4. Add a call to InitDMType in InitDataMs for the new type. (DataMassage.pas }

unit DataMassage;
interface
{$ifc Profile_On }
  uses
    Profiler,
{$elsec }
  uses
{$endc }
    CompileTime, PrintTraps, AutoLib, ChuckStuff, Globals, FastStuff, {}
    Tree3DGlob, MiscRoutines, RawUnit, formTree3D, Tree3D, {}
    ChucksDAs, DMTypes, DMGlobals, SomeDMs, DG2Bright, SimpleDMs, RobotDMs, {}
    TrigDMs, HandleDMs, TimeDMs, GestDM, ConvolveDM,{}
    DMEdit, EdDMList, Flex, FlexDraw, DMFileIO, ScottsDMs, midiDMs, {}
    PointDMs, FixedDMs, waveformDMs, bezierDM, ShowDM;


  procedure reHookupDMIO;
  procedure ReOrderDMIO;
  procedure UpdateDM (var dm: DMRec);
  procedure DM_OnOff (var dm: DMRec; turnon: boolean);
  procedure DMWindow (on: boolean);
  procedure DMwindMenu (dyItem: integer);
  procedure menuSwivel (dyItem: integer);
  procedure InitDataMs;
  function SetDMIO (setIn: boolean; name, inName: nameStr; newkind: inputKind; ioIdx, int: integer):
      boolean;
  function NewDM (name, typeName: nameStr): boolean;

  procedure DeleteAllDMs;
  procedure FlexEdit (item: integer);
  procedure CloseDataMs;
  procedure DataMassage;
  procedure DescribeDMs (var out: Text; fileName: string);
  procedure DescribeDMTypes (var out: Text);
  procedure doDMMenu (Item_No: integer);

  function OpenDMs (vref: integer; fname: string; merge: boolean): integer;
  function SaveDMs (vref: integer; fname: string): integer;

  procedure FlexKey (key: char);

 {$ifc Profile_On }
```

```
  procedure do_InitProfile;
  procedure do_ResetProfile (dyItem: integer);
  procedure do_DumpProfile (dyItem: integer);
{$endc }

implementation

  var
    DMWDyItem: integer;   { dynamic menu item number for the DM's item in Windows. }
    DMdataArray: array[0..MaxDMSlots] of integer;

    TimeInc: integer;          { Used by the 'T' key in the flex window to calculate hertz rate. }
    OutInc: integer;           { Used to calculate output hertz rate. }
    TimeJiffy: LongInt;

    { These routines are actually in SGICom.pas. They are just declared here so DataMassage can }
    { find a reference for them. The linker will resolve the cicular problem. }
  procedure doOccDM (var dm: DMRec);
  external;
  procedure HandleOccDM (v: DMVerb; var dm: DMRec);
  external;
  procedure doIAttribDM (var dm: DMRec);
  external;
  procedure doAtribIndexDM (var dm: DMRec);
  external;
  procedure HandleIAttribDM (v: DMVerb; var dm: DMRec);
  external;

{ ExScriptName is declared later on so the linker will find the procedure name for this }
{ external reference. }
  function ExScriptName (str: string): boolean;
  external;


  procedure reHookupDMIO;
{ The tree or Raw has been edited. Rehook up all the I/O to the DM modules. }
{ This routine can be called as often as you want. In fact calling it more is better }
{ than calling it less than you need. }
  begin
    HookupAllDMs;
  end;

  procedure ReOrderDMIO;
{ The list of DM's has been edited. Reorder, rehook up and writecode for all the I/O to the DM modules. }
{ This routine can also be called as often as you want but it takes longer. It should definitely be}
{ called everytime the DM list has additions, subtractions or name changes. }
  begin
    ReOrderDMs(true);
  end;

  procedure UpdateDM; { (var dm: DMRec) }
{ Something about this DM has been changed. Update it by hooking up it's IO and updating it's flex display. }
  begin
```

```
    HookupIO(dm);
    UpdateOneFlex(dm);
  end;

  procedure DM_OnOff (var dm: DMRec; turnon: boolean);
    { Turn this DM off or try to turn it on.  After done mark it as a DM that turns on/off alot. }
  begin
    if turnon then
      dm.state := on
    else
      dm.state := usrOff;
    UpdateDM(dm);
    dm.turnsOnOff := true;              { Set this as a DM that turns on and off alot. }
  end;

  procedure DMWindow; {• on : boolean);•}
    var  { Set the state of the DMwindow to on/off. }
      i: integer;
  begin
    ChangeSlotWind(DMSlotDesc, on);
    i := dyItemtoItem(WindMHndl, DMWDyItem);
    CheckItem(WindMHndl, i, on);
    DMCodeInvalid := true;
    CallDMCode := not on;           { If the DM's window is on don't call the written code }
{$ifc Debug }
    if CallDMCode then
      if OptionIsDown then
        CallDMCode := false;
{$endc }
  end;

{-------------------------------------------------------------}
{ DMsOnOff dm. }
{ 2-6 inputs, First is a boolean, the rest are from DM's, 1 output, a boolean. }
{ This Turns a list of DMs on or off.  If Input #1 is true all the DM's are turned on, else off. }

  procedure doDMsOnOff (var dm: DMRec);
    var
      on: Boolean;
      i, idx: integer;
  begin
    with dm do
      begin
        if (SlotsIn[0].ptrfrm^.i <> 0) <> (PointsOut[0].LastValue.i <> 0) then
          begin
            { Boolean of input is not the same as boolean of output. }
            on := not (PointsOut[0].LastValue.i <> 0);
            PointsOut[0].LastValue.i := ord(on);
            for i := 1 to maxDMInput do
              with SlotsIn[i] do
                if ptrfrm <> nil then
                  if kind = frmDM then
                    begin
```

```
                idx := FindDM(name, true);
                if idx >= 0 then
                  DM_OnOff(DMRecsPtr^[idx], on);
              end;
        end;
      end;
    end;

procedure HandleDMsOnOff (v: DMVerb; var dm: DMRec);

  procedure SetOutState;
    var
      i, idx: integer;
  begin
    with dm do
      begin
        for i := 1 to maxDMInput do
          with SlotsIn[i] do
            if ptrfrm <> nil then
              if kind = frmDM then
                begin
                  idx := FindDM(name, true);
                  if idx >= 0 then
                    begin
                      if DMRecsPtr^[idx].state = on then
                        PointsOut[0].LastValue.i := 1
                      else
                        PointsOut[0].LastValue.i := 0;

                      leave;
                    end;
                end;
      end;
  end;

begin
  case v of
    initDM:           { Called once the first time this DM is started. }
      begin
        if dm.private <> nil then
          doClose(dm);
        SetOutState;
      end;
    fopenDM:
      SetOutState;
    otherwise
      GenericHandle(v, dm);
  end;    { case }
end;

procedure DMwindMenu; { (dyItem : integer) }
{ This get's called by the dynamic menu manager when the Windows/DM's item }
```

```
{ is hit.  Either bring the window to the front, turn it on or turn it off. }
   var
     i: integer;
  begin
    if WindowOn(DMSlotDesc.wp) and (DMSlotDesc.wp <> FrontWindow) then
      SelectWindow(DMSlotDesc.wp)
    else
      DMWindow(not WindowOn(DMSlotDesc.wp));
  end;

{------------------------------------------------------}
  procedure menuSwivel; { (dyltem: integer) }
  begin
    ChangeWrtMass(not wrtMassOn);
  end;

  procedure menuWriteCode (dyItem: integer);
  begin
    WriteDMCode;
    CallDMCode := optionIsDown;
  end;

  procedure AllDisplayOff (dyItem: integer);
    { Turn off all the dm displays that show up in the DM window. }
    var
      i: integer;
  begin
    for i := 0 to numOfDMRec do
      with DMRecsPtr^[i] do
        if dispLast then
          begin
            displast := false;
            SetDisplay(DMRecsPtr^[i], false);
            FileDirty[dmFile] := true;
          end;
  end;


 { Called at the beginning of the program.  Do whatever initialization is nessasary }
  procedure InitDataMs;
    var
      i: integer;
      h: Handle;
      nums: DSet;
      theGroup: integer; {for popups}


    procedure InitDMType (dt: DMtype; vproc: ProcPtr; Dname: nameStr; Din, Dout: integer; procPtr:
        Ptr; isRes: boolean);
 { Add this as a new DM type. }
      var
        i: integer;
    begin
```

```
    if topDMType >= maxDMTypes then
      Announce('DMTypes Array full.')
    else
      begin
        topDMType := topDMType + 1;
        DMOffsetList[theGroup] := DMOffsetList[theGroup] + 1;          {count the group for popUpmenus}
        with DMTypes[topDMType] do
          begin
            name := Dname;
            inputs := Din;
            outputs := Dout;
            kind := dt;
            verbProc := StripAddress(vproc);
            for i := 0 to maxDMInput do          { Initialize the default inputs and outputs to be integer
      types. }
              inTypes[i] := [intD];
            for i := 0 to maxDMOutput do
              begin
                outTypes[i] := [intD];
                defaultOut[i] := intD;
              end;
            codeRes := isRes;
            if procPtr = nil then
              massageProc := StripAddress(@doMassage)
            else
              massageProc := StripAddress(procPtr);
          end;
      end;
  end;
  procedure InitDMType2 (vproc: ProcPtr; Dname: nameStr; Din, Dout: integer; procPtr: Ptr; allIns,
      allOuts: DSet);
    var
      i: integer;
      d: DType;
  begin
    InitDMType(passRaw, vproc, DName, Din, Dout, procPtr, false);
    with DMTypes[topDMType] do
      begin
        for i := 0 to maxDMInput do          { Initialize the allowable input types. }
          inTypes[i] := allIns;
        for d := intD to pred(undefD) do          { Decide on the default output type. }
          if d in allOuts then
            leave;
        for i := 0 to maxDMOutput do
          begin     { Set the default output and allowable output types. }
            outTypes[i] := allOuts;
            defaultOut[i] := d;
          end;
      end;
  end;

  procedure AddCodeDMs;
      { Search for resources of type 'DMcd'. These are DM code modules. }
```

000154

```
const
  DMCodeRes = 'DMcd';
var
  i: integer;
  rType: ResType;
  name: Str255;
  id: integer;
begin
 for i := 1 to Count1Resources(DMCodeRes) do
  begin
   h := Get1IndResource(DMCodeRes, i);
   if h = nil then
    cycle;
   GetResInfo(h, id, rType, name);
   MoveHHi(h);
   HLock(h);
   InitDMType(passRaw, Pointer(h^), name, (id mod 100) div 10, id mod 10, Pointer(h^), true);
  end;
end;

procedure newGroup (itsName: str255);
begin
 if theGroup + 1 >= maxDMgroups then
  begin
   sysBeep(2);
   announce(stringof('DM types menu full'));
  end
 else
  begin
   theGroup := theGroup + 1;
   AppendMenu(PopUpMenu, itsName);
   currentDMgroups := currentDMgroups + 1;
  end;
end;

begin
 maxDMRec := 25;
 h := NewHandle(sizeOf(DMRec) * longint(maxDMRec + 1));
 if (h = nil) then
  begin
   Announce(StringOf('InitDataMassage memory error #', MemError));
   finished := true;
  end
 else
  begin
   MoveHHi(h);
   HLock(h);
   DMRecsPtr := DMRecsPtrType(h^);
  end;
 DataMassageAddr := @DataMassage;
 HandleDMMenusAddr := @HandleDMMenus;
 CodeHandle := CodeHandleType(NewHandle(10 * 1024));
 if (CodeHandle = nil) then
```

```
      Announce('CodeHandle allocation failed.')
    else
      begin
        MoveHHi(Handle(CodeHandle));
        HLock(Handle(CodeHandle));
      end;
    RecMassOn := false;
    PlayMassOn := false;
    wrtMassOn := false;
    RecNodeNum := 0;
    doAllDMs := true;                 { Start out with DM's enabled. }
    CallDMCode := false;              { and not using written code. }
    recBuffH := nil;
    numOfDMRec := -1;                 { Start out with no DM modules. }
    topDMType := -1;                  { and no DMTypes. }
    numOfDMClip := -1;                { and nothing in the clipboard. }
    NotOrdered := 0;
    TimeInc := 0;
    TimeJiffy := TickCount;
    StructPtrSet := [pointD, pointListD];      { Set of datatypes that are > 4 bytes so pass pointers. }

    h := NewHandle(sizeof(RecordedTreeAr));
    if h <> nil then
      begin
        MoveHHi(h);
        HLock(h);
        RecTreePtr := Pointer(StripAddress(h^));
      end
    else
      begin
        AnnounceB(StringOf('InitDataMs: NewHandle of RecTreePtr failed.'));
        RecTreePtr := nil;
      end;
    with DMInfo do
      begin
        AcquireRefreshPtr := @AcquireRefresh;
        GetStringsPtr := @GetStrings;
        SetSixthPtr := @SetSixth;
        DescribeStrPtr := @DescribeStr;
      end;

    for i := 0 to maxDMTypes do
      DMTypes[i].name := '';

{**** note:  to add or re-arrange DM types, merely put them between the appropriate *****}
{       "theGroup:=x" marker.  The count is automatic.  You can easily change the names and orders}
{       of the items in the popUp menu by changing the text in the appendMenu calls.  The resource}
{       popUp menu is  blank, so the appendMenu calls are imperitive. }

{intitialize the auto-counter array and so on.  It crashes if you don't}
    for theGroup := 1 to maxDMgroups do
      DMOffsetList[theGroup] := 0;
    theGroup := 0;
```

```
currentDMgroups := 0;

NewGroup('Miscellaneous        ');

{ Negative inputs and outputs are variable num in and outs. }
{ Inputs:  -1 = any number of inputs, -2 = even number, -3 = triplicates (3 or 6) }
{ Outputs: -1 = same as inputs, -2 = half num of inputs, -3 = 1/3 num of inputs. }

nums := [intD, longD, fixedD, realD];

InitDMType2(@HandlePass, 'PassRaw', -1, -1, @doPass, [sameD], nums);
InitDMType2(@HandleScale, 'Scale/Offset', -1, -1, @doScale, nums, nums);
InitDMType2(@HandleShow, 'ShowValue', 1, 0, @doShow, nums, []);
InitDMType2(@HandleConst, 'Const', 0, 1, @doConst, [undefD], nums);
InitDMType(passRaw, @HandleExScript, 'Run Script', 1, 1, @doExScript, false);
InitDMType(passRaw, @GenericHandle, 'Latch', 2, 1, @doLatch, false);
InitDMType(passRaw, @HandleGest, 'Single Gesture', 6, 1, @doGest, false);
InitDMType(passRaw, @HandleLookup, 'Table Lookup', 1, 1, @doLookup, false);
InitDMType(passRaw, @GenericHandle, 'Sort Two Numbers', 2, 2, @doSort2Values, false);
InitDMType(passRaw, @GenericHandle, 'ByteSwap', -1, -1, @doByteSwap, false);
InitDMType2(@HandleClock, 'Clock', 0, 2, @doClock, [], [intD]);
InitDMType2(@HandleClock, 'VariClock', 1, 2, @doClock, [intD], [intD]);

NewGroup('Filters');

InitDMType(passRaw, @HandleLimit, 'LimitTo', -1, -1, @doLimit, false);
InitDMType(passRaw, @HandleStep, 'StepByX', -1, -1, @doStep, false);
InitDMType(passRaw,, @HandleDebounce, 'Debounce', 1, 1, @doDebounce, false);
InitDMType(passRaw, @HandleStretch, 'StretchPulse', 1, 1, @doStretch, false);
InitDMType(Smooth, @HandleSmooth, 'Smooth', -1, -1, @doSmooth, false);
InitDMType(Delay, @HandleDelay, 'Delay', 2, 1, @doDelay, false);

NewGroup('Arithmetic');

InitDMType2(@HandleMath, 'Plus', -1, 1, @doPlus, [sameD], nums);
InitDMType2(@HandleMath, 'Minus', -1, 1, @doMinus, [sameD], nums);
InitDMType2(@HandleMath, 'Times', -1, 1, @doTimes, [sameD], nums);
InitDMType2(@HandleMath, 'Divide', 2, 1, @doDiv, [sameD], nums);
InitDMType(passRaw, @HandleMath, 'Modulo', 2, 2, @doModulo, false);
InitDMType(passRaw, @HandleMath, 'BitAnd', -1, 1, @doBitAnd, false);
InitDMType(passRaw, @HandleMath, 'BitOr', -1, 1, @doBitOr, false);
InitDMType(passRaw, @HandleMath, 'BitXor', -1, 1, @doBitXor, false);
InitDMType(passRaw, @GenericHandle, 'BitNot', 1, 1, @doBitNot, false);
InitDMType(passRaw, @GenericHandle, '3Plus', -1, -2, @doPluses, false);
InitDMType(passRaw, @GenericHandle, '3Minus', -1, -2, @doMinuses, false);
InitDMType(passRaw, @GenericHandle, '3Times', -1, -2, @doTimeses, false);
InitDMType2(@GenericHandle, 'TypeCast', -1, -1, @doTypeCast, nums, nums);

NewGroup('Boolean');

InitDMType(passRaw, @HandleCompares, 'Equal', 2, 1, @doEqual, false);            { Boolean DM's }
InitDMType(passRaw, @HandleCompares, 'Greater or Equal', 2, 1, @doGreaterEq, false);
InitDMType(passRaw, @HandleCompares, 'Greater Than', 2, 2, @doGreaterThan, false);
```

```
InitDMType(passRaw, @HandleCompares, 'Less or Equal', 2, 1, @doLessEq, false);
InitDMType(passRaw, @HandleCompares, 'Less Than', 2, 1, @doLessThan, false);
InitDMType(passRaw, @HandleCompares, 'Not Equal', 2, 1, @doNotEq, false);
InitDMType(passRaw, @GenericHandle, 'Not', 1, 1, @doNot, false);
InitDMType(passRaw, @GenericHandle, 'Boolean Out', 1, 2, @doBoolean, false);
InitDMType(passRaw, @GenericHandle, 'One Shot', -1, -1, @doOneShot, false);
InitDMType(passRaw, @GenericHandle, 'Leading Edge', -1, -1, @doLeadingEdge, false);
InitDMType(passRaw, @GenericHandle, 'Fire', 1, 1, @doFire, false);
InitDMType(passRaw, @GenericHandle, 'FireOneOut', 1, 6, @doFireOutput, false);
InitDMType2(@GenericHandle, 'PassIfTrue', 2, 1, @doPassIfTrue, [sameD], nums);
InitDMType2(@HandleDMsOnOff, 'DMs On/Off', -1, 1, @doDMsOnOff, [intD..undefD], [intD]);
DMTypes[topDMType].inTypes[0] := [intD];

NewGroup('Trigonometric');

InitDMType(passRaw, @GenericHandle, 'Fast Pythagorean', 2, 1, @doFastPyth, false);
InitDMType(passRaw, @GenericHandle, 'AngFrm3Side', 3, 1, @doAng3Side, false);
InitDMType(passRaw, @GenericHandle, 'Angle Points', 4, 1, @doAngleBetweenPoints, false);
InitDMType(passRaw, @GenericHandle, 'ArcSin(a/b)', 2, 1, @doRightTriSine, false);
InitDMType(passRaw, @GenericHandle, 'ArcTan(a/b)', 2, 1, @doArcDiv, false);
InitDMType(passRaw, @GenericHandle, 'Pythagorean', 2, 1, @doPythagorean, false);
InitDMType(passRaw, @GenericHandle, 'SineLaw', 3, 1, @doSineLaw, false);

NewGroup('Mathematic');

InitDMType(passRaw, @GenericHandle, 'Absolute', 1, 1, @doAbsolute, false);
InitDMType(AveTwo, @GenericHandle, 'Average Two', 2, 1, @doAveTwo, false);
InitDMType(passRaw, @HandleAveby, 'AvebyX', -1, -1, @doAveby, false);
InitDMType(passRaw, @GenericHandle, 'Cube', 1, 1, @doCube, false);
InitDMType(ExpCalib, @HandleOneExp, 'Exp Calibration', -1, -1, @doOneExp, false);
InitDMType(BigExpCalib, @HandleOneExp, '1K Exp Calib', -1, -1, @doOneExp, false);
InitDMType(passRaw, @GenericHandle, 'Exponential', 1, 1, @doExponential, false);
InitDMType(passRaw, @GenericHandle, 'FirstNonZero', -1, 1, @doNonZero, false);
InitDMType(LinCalib, @HandleOneExp, 'Linear Calib', -1, -1, @doOneExp, false);
InitDMType(BigLinCalib, @HandleOneExp, '1K Linear Calib', -1, -1, @doOneExp, false);
InitDMType(passRaw, @GenericHandle, 'Negation', 1, 1, @doNegation, false);
InitDMType2(@GenericHandle, 'Polynomial', 6, 1, @doPolynomial, [intD, realD, longD], [intD]);
InitDMType(passRaw, @HandleRandom, 'Random', 0, 1, @doRandom, false);
InitDMType(passRaw, @GenericHandle, 'Round', 2, 1, @doRound, false);
InitDMType(passRaw, @GenericHandle, 'Speed', 2, 1, @doSpeed, false);
InitDMType(passRaw, @GenericHandle, 'Square', 1, 1, @doSquare, false);
InitDMType2(@GenericHandle, 'SquareRoot', 1, 1, @doSqrRoot, [sameD], nums);
InitDMType(passRaw, @GenericHandle, 'SquareRoot', 1, 1, @doSqrRoot, false);
InitDMType(passRaw, @GenericHandle, '-180 to +180', 1, 1, @doNegDegree, false);

NewGroup('Sounds');

InitDMType(passRaw, @HandleMIDI, 'MIDI Controller', 3, 0, @doController, false);
InitDMType(passRaw, @HandleMIDI, 'MIDI PitchBend', 2, 0, @doPitchBend, false);
InitDMType(passRaw, @HandleMIDI, 'MIDI Note On', 4, 0, @doNoteOn, false);
InitDMType(passRaw, @HandleMIDI, 'MIDI Sustain Note', 3, 0, @doSustain, false);
InitDMType(passRaw, @HandleMIDI, 'MIDI All Notes Off', 1, 0, @doAllNotesOff, false);
InitDMType(passRaw, @GenericHandle, 'Beep', 1, 0, @doBeep, false);
```

```
InitDMType(passRaw, @HandleWaveforms, 'Sawtooth', 1, 1, @doSawTooth, false);
InitDMType2(@HandleConvolve, 'Convolvotron', 3, 0, @doConvolve, [intD], [undefD]);

NewGroup('Point Modifiers');

InitDMType2(@HandleInPointList, 'InPointList', -1, 1, @doInPointList, [pointD], [pointListD]);

{BEZIER}
load_code_res; {loads BEZIER CODE RESOURCE }
if (bezierCodePtr <> nil) then
  begin
    InitDMType2(@HandleBezier, 'Bezier', 4, 3, @doBezier, [intD], [intD]);
    DMTypes[topDMType].inTypes[0] := [pointD];
    DMTypes[topDMType].inTypes[2] := [intD];
    DMTypes[topDMType].outTypes[0] := [undefD];
    DMTypes[topDMType].defaultOut[0] := undefD;
  end
else
  announceB('Can''t get Bezier DM.  Sorry...');

InitDMType(passRaw, @GenericHandle, 'FollowPt', 0, 2, @doFollowPt, false);

InitDMType2(@GenericHandle, '2ndFollowPt', 2, 1, @do2ndFollow, [pointD], [undefD]);
DMTypes[topDMType].inTypes[1] := [intD];
InitDMType2(@HandlePtOffset, 'Point Offset', 2, 1, @doPtOffset, [pointD], [undefD]);
DMTypes[topDMType].inTypes[1] := [intD];

InitDMType2(@GenericHandle, 'Global Position', 1, 3, @doGlobPos, [pointD], [intD]);
InitDMType2(@GenericHandle, 'Global Delta', 2, 3, @doGlobDelta, [pointD], [intD]);
InitDMType2(@GenericHandle, 'Global Distance', 2, 1, @doGlobDistance, [pointD], nums);

InitDMType2(@HandleHitTest, 'HitTest', -1, -1, @doHitTest, [pointD, pointListD], [intD]);
DMTypes[topDMType].inTypes[0] := [intD];

InitDMType2(@HandlePolhemusDM, 'Polhemus', 1, 1, @doPolhemusDM, [intD], [undefD]);
InitDMType2(@HandleWatchPt, 'Watch Point', 2, 1, @doWatchPt, [undefD], [undefD]);
DMTypes[topDMType].inTypes[0] := [pointD];
DMTypes[topDMType].inTypes[1] := [intD];

{$ifc false }
  NewGroup('Fixeds');
  InitDMType2(@HandleScaleFix, 'Scale/Offset.f', -1, -1, @doScaleFix, [fixedD], [fixedD]);
{$endc }

  NewGroup('User Functions');

  InitDMType(setDG2Bright, @HandleDG2Bright, 'Set DG2 Level', 2, 0, @doDG2Bright, false);
  InitDMType(wrtFlash, @HandleWrtFlash, 'Write to DataFlash', 1, 1, @doWrtFlash, false);
{$ifc false }
  InitDMType(RobotMaster, @HandleRMaster, 'Robot Master', 0, 0, @doRMaster, false);
  InitDMType(RobotSlave, @HandleRSlave, 'Robot Slave', -1, 0, @doRSlave, false);
{$endc }
  InitDMType(passRaw, @GenericHandle, 'ArmPitches', 6, 3, @doArmPitches, false);
```

```
{$ifc for_SGIs }
   InitDMType(passRaw, @HandleOccDM, 'InterOccular', 2, 1, @doOccDM, false);
   InitDMType2(@HandleIAttribDM, 'Isaac Attributes', -1, 0, @doIAttribDM, [pointD], [undefD]);
   DMTypes[topDMType].inTypes[0] := [intD];
   InitDMType2(@HandleIAttribDM, 'Index IsaacAttribs', 2, 0, @doAtribIndexDM, [pointD], [undefD]);
   DMTypes[topDMType].inTypes[0] := [intD];
{   InitDMType(passRaw, @HandleSpecialScale, 'TexpoScale', 4, 1, @doSpecialScale, false); }
{$endc}

   InitConvolvers;

   AddCodeDMs;

   if not turnkey then
    with DMSlotDesc do
     begin
       dataPtr := Pointer(NewPtr(MaxDMSlots * 2));
       dataPtr := @DMdataArray;
       if dataPtr = nil then
         AnnounceB(StringOf('InitDataMs: NewPtr of DMSlotDesc.dataPtr failed.'));
       dataDefPtr := @DMDataDef;
       maxSlot := MaxDMSlots - 2;
       InitSlot(DMSlotDesc, 'DM Display', false, DMWindID, nil);
       SendBehind(DMSlotDesc.wp, nil);
       DMWDyItem := dyNewItem(WindMHndl, 'DM Display', @DMwindMenu, false);
       DMWindow(WindowOn(DMSlotDesc.wp));
       i := dyNewItem(DMMHndl, 'Clear DM Display Wind', @AllDisplayOff, false);
{•    i := dyNewItem(DMMHndl, 'Write DM Code', @menuWriteCode, false);•}

     end
   else
    DMSlotDesc.wp := nil;
   InitFlex(not turnkey);
  end;

{ Called at the end of the program.  Does it have to do anything? }
 procedure CloseDataMs;
  var
   i: integer;
 begin
  CloseFlex;
  if not turnkey then
   begin
     if DMSlotDesc.wp <> nil then
       CloseSlot(DMSlotDesc, DMWindID);
   end;
  for i := 0 to numOfDMRec do
   doVerb(closeDM, DMRecsPtr^[i]);
 end;

 { These routines are here for scripts to be able to call them. }
  function NewDM; { (name, typeName : nameStr) : boolean }
```

```
  { Make a new DM module with no inputs or outputs.  Return true if it worked. }
  var
    i, typeIdx: integer;
begin
  NewDM := false;
  if FindDM(name, true) >= 0 then
    Announce(concat('A DM named ', name, ' already exists.'))
  else
    begin
      typeIdx := FindDM(typeName, false);
      if typeIdx < 0 then
        Announce(concat('Data Massage type ', typeName, ' not found.'))
      else if AddDMmodule(false) then
        begin
          NewDM := true;
          DMRecsPtr^[numOfDMRec].name := name;
          DMRecsPtr^[numOfDMRec].inputs := DMTypes[typeIdx].inputs;
          DMRecsPtr^[numOfDMRec].outputs := DMTypes[typeIdx].outputs;
          DMRecsPtr^[numOfDMRec].massageProc := DMTypes[typeIdx].massageProc;
          DMRecsPtr^[numOfDMRec].state := off;
          FlexAdd(DMRecsPtr^[numOfDMRec]);
        end;
    end;
end;   { NewDM }

function SetDMIO;     {•(setIn : boolean;•}
                      {•     name, inName : nameStr;•}
                      {•     newkind : inputKind;•}
                      {•     ioIdx, int : integer) : boolean;•}
{ Set the input #ioIdx for the DM named 'name' to point to kind,inName.  if newkind }
{ is frmTree int = the sixAxisType, if newkind is frmDM int = inNames out index. }
  var
    dmIdx, i: integer;
    found: boolean;
    errStr: string;
    p: PRecPtr;
begin
  if not setIn then            { output can only go to the }
    newkind := frmTree;        { tree. }
  errStr := '';
  dmIdx := FindDM(name, true);
  if dmIdx < 0 then
    errStr := concat('DM ', name, ' not found.')
  else
    begin
      if setIn then
        begin
          if DMRecsPtr^[dmIdx].inputs < ioIdx then
            errStr := 'Not enough inputs.';
        end
      else if DMRecsPtr^[dmIdx].outputs < ioIdx then
        errStr := 'Not enough outputs.';
      if errStr = '' then
```

```
        case newkind of
          frmRaw:
            begin
              i := FindRaw(inName, nil);
              if i < 0 then
                errStr := concat('Raw slot "', inName, '" not found.');
            end;
          frmTree:
            if setIn or (inName <> '') then   { Allow setting of output to '' }
              begin
                p := FindTreeName(mainTreePtr, inName);
                if p = nil then
                  errStr := concat('Node ', inName, ' not found.');
              end;
          frmDM:
            begin
              i := FindDM(inName, true);
              if i < 0 then
                errStr := concat('DM ', inName, ' not found.')
            end;{ case }
        end;    { if enough inputs }
    end;        { if we found the dm }
   if errStr <> '' then
     begin
       SetDMIO := false;
       Announce(errStr)
     end
   else
     with DMRecsPtr^[dmIdx] do
       begin
         SetDMIO := true;
         if setIn then
           begin
             slotsIn[ioIdx - 1].name := inName;
             slotsIn[ioIdx - 1].kind := newKind;
             slotsIn[ioIdx - 1].inIdx := int;
           end
         else
           begin
             PointsOut[ioIdx - 1].name := inName;
             PointsOut[ioIdx - 1].SixAxis := SixAxisType(int);
           end;
         HookupIO(DMRecsPtr^[dmIdx]);
         UpdateOneFlex(DMRecsPtr^[dmIdx]);
       end;
 end;        { SetDMIO }

 procedure DeleteAllDMs;
{ Delete all the DM modules that are installed.  (Called by File Menu 'New') }
   var
     i: integer;
     h: Handle;
 begin
```

```
    while DeleteDMmodule(0, false) do
      ;
    HookupAllDMs;        { Make sure executable code is zeroed out }
    { Remove all the picture resources that are used by the flex window. }
    DeletePICTs(ApplRes);
    UpdateResFile(ApplRes);
    FlexRedo(false);              { Make sure flex window is properly updated. }
    DMSlotDesc.numUsed := -1;
    ResizeSlotW(DMSlotDesc);
    SlotUpdate(DMSlotDesc);
  end;

  procedure CalibrateAllDMs;
{ Send a calibrate message to all the the DM modules that are currently on. }
    var
      i, j: integer;
  begin
    if numOfDMRec <> -1 then
      begin
        for i := 0 to numOfDMRec do
          if DMRecsPtr^[i].state = on then
            doVerb(calibDM, DMRecsPtr^[i]);
      end;
    FileDirty[dmFile] := true;
    DMCodeInvalid := true;
  end;    { CalibrateAllDMs }

  procedure FlexClear;
    var
      i, count: integer;
  begin
          { Traverse the list deleting any selected dmrecs.  If one is deleted the}
          { next one up will fall into it's slot so stay on the slot until it isn't }
          { or you are at the end of the list.  If this deletes more than 4 DM's then }
          { tell DeleteDMmodule not to update the flex, will do it with FlexRedo. }
    i := 0;
    count := 0;
    while i <= numOfDMRec do
      begin
        while (i <= numOfDMRec) and (DMRecsPtr^[i].FlexH^^.selected) do
          begin
            if DeleteDMmodule(i, (count < 4)) then
              ;
            count := count + 1;
            if (i > numOfDMRec) then
              leave;
          end;
        i := i + 1;
      end;
    ReorderDMs(false);
    FlexRedo(false);
  end;
```

```
procedure PasteDMClip;
  { Paste all the DM's in the clipboard back into the DMList. }
  var
    i, j, k, err, oldnum: integer;
    hp: Handle;
    gotSpace: boolean;
    str, modName: NameStr;
    offpt: Point;
    Suffix: array[0..maxDMclips] of SuffixType;

  function FindClipName (name: nameStr): integer;
    { Return an index if the given name was a name in the clipboard. }
    var
      i: integer;
  begin
    FindClipName := -1;
    for i := 0 to numOfDMClip do
      if EqualString(DMClipBoard[i]^^.name, name, false, false) then
        begin
          FindClipName := i;
          leave;
        end;
  end;      { FindClipName }

  function NameInUse (idx: integer): boolean;
    { Return true if this name is in use in either the DM list or the DM clipboard. }
    var
      j: integer;
      n: NameStr;
  begin
    NameInUse := false;
    n := AddSuffix(Suffix[idx]);
    j := FindDM(n, true);          { Name already in use in the DM list? }
    if j <> -1 then
      NameInUse := true              { Yes, return true. }
    else
      begin                         { No, check in the clipboard up to this name. }
        for j := 0 to idx - 1 do
          if n = AddSuffix(Suffix[j]) then
            begin
              NameInUse := true;
              leave;
            end;
      end;
  end;

begin
  gotSpace := true;
  repeat
    if numOfDMRec + numOfDMClip >= maxDMRec then
      gotSpace := trytoGetMoreSpace;
  until not gotSpace or (numOfDMRec + numOfDMClip < maxDMRec);
  if not gotSpace then
```

T

```
    begin
      Announce('Paste DM''s failed.  Space can''t be allocated.');
      exit(PasteDMClip);
    end;

      { For each DM in the clipboard, go through and find if it's name already exist in the DM list. }
      { If it does, search for <name>2, then <name>3 etc until the name in unique. }
  for i := 0 to numOfDMClip do
    with DMClipBoard[i]^^ do
      begin
        ExtractSuffix(name,  Suffix[i]);
        if NameInUse(i) then
          begin          { If already in use make new unique name. }
            Suffix[i].n  :=  1;
            repeat
              if NameInUse(i) then
                begin
                  Suffix[i].n  :=  Suffix[i].n  +  1;
                end
              else
                leave;
            until  false;
          end;
      end;      { for i }

  oldnum := numOfDMRec;
  for i := 0 to numOfDMClip do
    begin                    { Now append all the DM's in the clip to the end }
      numOfDMRec := numOfDMRec + 1;                     { of the DM list. }
      DMRecsPtr^[numOfDMRec]  :=  DMClipBoard[i]^^;
      if DMClipBoard[i]^^.private  <>  nil then
        begin          { Make copy of private storage and }
          hp  :=  Handle(DMClipBoard[i]^^.private);          { use the copy. }
          err  :=  HandtoHand(hp);
          MoveHHi(hp);
          HLock(hp);
          DMRecsPtr^[numOfDMRec].private  :=  hp^;
        end;
      with DMRecsPtr^[numOfDMRec] do
        begin
          dyMenuItem  :=  0;                              { no menu exists when loaded. }
          flexH  :=  nil;                               { also no flex display exists. }
          if state = on then                              { do this so HookupIO won't report }
            state  :=  off;                               { weird errors. }
          dispIdx  :=  -1;                              { no display index when loaded. }
          if dispLast then
            SetDisplay(DMRecsPtr^[numOfDMRec],  true);
          name  :=  AddSuffix(Suffix[i]);                 { Make sure you have the new name. }
          for j := 0 to 5 do                              { Check if any of the inputs refer to }
            with SlotsIn[j] do                            { DM's that are also in the clipboard. }
              if kind = frmDM then
                begin
                  k := FindClipName(name);                { If so and we changed the other DM's name }
```

```
            if k <> -1 then
              name := AddSuffix(Suffix[k]);          { Then also change this inputs name. }
          end;
        HookupIO(DMRecsPtr^[numOfDMRec]);
        doVerb(fopenDM, DMRecsPtr^[numOfDMRec]);
        if state = off then  { now turn all off's to on so any not hooked }
          state := on;      { up will be announced by ReHookIO. }
      end;
    end;
  FlexRedo(false);                         { Do this so FlexH^^ records will be allocated for
      new DM's. }
  for i := oldnum + 1 to numOfDMRec do     { Set all new DM's flex selected to true }
    DMRecsPtr^[i].FlexH^^.selected := true;
  ReorderDMs(true);                                { Reorder, Hookup, rewrite code. DM list }
  FlexRedo(true);                          { and FlexRedo(true) so pasted DM 's will be
      selected. }
  FileDirty[dmFile] := true;
end;

procedure ClearDMClip;
  var
    h: Handle;
    i: integer;
begin
  for i := 0 to numOfDMClip do
    begin
      if DMClipBoard[i]^^.private <> nil then
        DisposHandle(Handle(DMClipBoard[i]^^.private));
      DisposHandle(Handle(DMClipBoard[i]));
    end;
  numOfDMClip := -1;
end;

procedure FlextoClip;
  var
    i: integer;
    berr: LongInt;
    desc: string;
  procedure doClip (var dm: DMRec; flexH: FlexHandle);
    var
      h, hp: Handle;
      err: integer;
  begin
    doVerb(fsaveDM, dm);
    h := NewHandle(sizeof(DMRec));
    if h <> nil then
      begin
        numOfDMClip := numOfDMClip + 1;
        DMClipBoard[numOfDMClip] := DMRecHandle(h);
        DMClipBoard[numOfDMClip]^^ := dm;
        DMClipBoard[numOfDMClip]^^.FlexH := nil;
        if dm.private <> nil then
          begin        { Make copy of private storage and }
```

```
            hp := RecoverHandle(dm.private);        { save it. }
            err := HandtoHand(hp);
            DMClipBoard[numOfDMClip]^^.private := Ptr(hp);  { private is going to have a handle, not
        pointer. }
          end;
        end;
      doVerb(fopenDM, dm); { bracket all fsaves with fopens. }
    end;
  begin       { FlextoClip }
    dotoSelec(doClip);
    desc := 'There is a DM clip.';
    berr := PutScrap(length(desc), DMResType, Pointer(ord4(@desc) + 1));

  end;

  procedure CliptoFlex;
    var
      h: Handle;
      offset: LongInt;
      i: integer;
  begin
    h := NewHandle(8);
    i := GetScrap(h, DMResType, offset);
    If i > 0 then
      begin
        if numOfDMClip >= 0 then
          PasteDMClip
      end;
    DisposHandle(h);
  end;

{ The FlexEdit procedure is here so it can call DeleteDM in EdDMList. }
  procedure FlexEdit; { (item : integer) }

    function HaveSelection: Boolean;
        { If there is any selection in the flex window then zero the scrap and }
        { return true, else return false. }
      var
        err: integer;
    begin
      HaveSelection := false;
      If (SelecRoot <> nil) or (PicSelRoot <> nil) then
        begin
          err := ZeroScrap;
          If err = noErr then
            HaveSelection := true
          else
            Announce(StringOf('ZeroScrap error # ', err : 1, '.'));
        end;
    end;

  begin
    case item of
```

```
    1:
      ;          {undo}
    3:   {cut}
      if HaveSelection then
        begin
          ClearDMClip;
          if SelecRoot <> nil then
            begin
              FlextoClip;
              FlexClear;
            end;
          PictureEdit(item);
        end;
    4:   {copy}
      if HaveSelection then
        begin
          ClearDMClip;
          if SelecRoot <> nil then
            FlextoClip;
          PictureEdit(item);
        end;
    5:   {paste}
      begin
        DeselectAll;
        CliptoFlex;
        PictureEdit(item);
        CenterSelections;
      end;
    6:   {clear}
      begin
        if SelecRoot <> nil then
          FlexClear;
        PictureEdit(item);
      end;
  end;  { case }
end;

procedure doPlay;   { play back the massaged data. }
{ modified 9/20/88 by CLB to write swivel commands to the textfile: out if }
{ wrtMassOn is true. }


  var
    counter: string[5];
    i, index, bits: integer;
    p: PRecPtr;
    posDirty, attDirty, writePos, writeAtt, writeWorld: boolean;
  begin
    if (playPtr.lp^ = $FFFFFF) or (playPtr.l >= playEndptr.l) then
      begin
        ChangePlayMass(false);
        if wrtMassOn then
          ChangeWrtMass(false);
```

```
    end
  else
    begin
      writeWorld := false;
      if wrtMassOn then
        writeln(out, '( Jiffy = ', playPtr.ip^ : 1, '  )');
      playPtr.l := playPtr.l + 4;        { skip past time stamp. }
      while playPtr.bp^ <> 0 do          { high byte will not be zero for deltachange }
        begin
          { high byte has bits for which sixAxis have changed. }
          bits := playPtr.ip^;
          { low byte is an index into recordedTree which has an index into Storage }
          index := RecTreePtr^[BitAnd(playPtr.ip^, $FF)].idx;
          p := IdxtoPtr(mainTreePtr, PRecPtr(index));
          p^.dirty := true;
          playPtr.l := playPtr.l + 2;
          if wrtMassOn then
            begin
              { if any position flags are set write them all. }
              writePos := (([out0, out1, out2] * p^.flags) <> []);
              { ditto for attitude flags. }
              writeAtt := (([out3, out4, out5] * p^.flags) <> []);
            end;
          posDirty := false;
          attDirty := false;
          for i := 0 to 5 do
            if BitTst(@bits, i) then
              begin
                SetSixth(p, i, playPtr.ip^);
                playPtr.l := playPtr.l + 2;
                if i < 3 then
                  posDirty := true
                else
                  attDirty := true;
              end;

          if wrtMassOn then           { if writing swivel then  }
            if (writePos and posDirty) or (writeAtt and attDirty) then
              with p^ do           { if writing dirty relative pos or attitude. }
                begin
                  writeWorld := true;
                  writeln(out, 'FindObject ', p^.name);  { set the current object. }
                  if posDirty and writePos then
                    writeln(out, 'RelPos: ', SwPosStr(lSix.pt.x), ' ', SwPosStr(lSix.pt.y), ' ',
        SwPosStr(-lSix.pt.z), '  ,');
                  if attDirty and writeAtt then
                    writeln(out, 'RelAtt: ', SwAngStr(lSix.tt.roll), ' ', SwAngStr(lSix.tt.pitch), ' ',
        SwAngStr(lSix.tt.yaw), '  ,');
                end;

        end;  { while proccessing changed nodes. }
      if wrtMassOn then
        begin
```

```
        if writeWorld then
          writeln(out, 'DrawWorld');
        writeln(out, '( WritePics )');
      end;
    end;        { if not done playing }
  end;          { doPlay }

procedure doRecord;    { record massaged data. }
  type
    longPtr = ^longInt;
  var
    lastPtr: ptrsType;
    i, j, k: integer;
    stp: SixPtrType;
    temp: array[0..7] of integer;
begin
  lastPtr := recPtr;
  if recPtr.l + 32 < RecEndPtr.l then
    begin
      recPtr.lp^ := rawTick - recStart;
      recPtr.l := recPtr.l + sizeof(longInt);
      for k := 1 to RecNodeNum do
        if recMassOn then
          with RecTreePtr^[k] do
            begin
              stp := SixPtrType(@mainTreePtr^.Storage[idx]^.lSix.pt);
              i := 1;
              temp[0] := 0;
              for j := 0 to 5 do
                if stp^.s[j] <> lastSix.s[j] then
                  begin
                    temp[i] := stp^.s[j];
                    BitSet(@temp[0], j);
                    i := i + 1;
                    lastSix.s[j] := stp^.s[j];
                  end;
              if temp[0] <> 0 then
                begin
                  temp[0] := BitOr(temp[0], bitAnd(k, $FF));  { set index to RecordedTree }
                  i := i * 2;    { turn intcount into bytecount. }
                  if recPtr.l + i > recEndPtr.l then  { ack! out of memory }
                    recMassOn := false
                  else
                    begin
                      BlockMove(@temp, recPtr.bp, i);
                      recPtr.l := recPtr.l + i;
                    end;
                end;
            end;    { for each node }
      if not recMassOn then
        begin
          recPtr := lastPtr;
          ChangeRecMass(false);
```

```
        end
      end;           { if at least 32 bytes left }
    end;    { doRecord }

  { This gets called from the main loop.  It does any data massaging currently queued. }
    procedure DataMassage;
      var
        i, j, value: integer;
      procedure doCallCode;
          { This routine just jsr's to the code in CodeHandle^.  This routine is here }
          { to surround the call with link/unlink. }
      begin
        call(ProcPtr(CodeHandle^));
      end;

    begin
      TimeInc := TimeInc + 1;          { Inc DM timer counter. }
      if DMCodeInvalid then            { If anything has marked the written code as invalid since the last time  }
        WriteDMCode;                   { DataMassage was called then re-write it before the DM's are executed.
          }
      DMCodeInvalid := false;
      ScriptListIdx := 0;
      if playMassOn then
        doPlay
      else if doAllDMs then              { user hasn't turned DM's off. }
        if CallDMCode then             { Call the executable code written with the }
          doCallCode                       { WriteCodeDM  message. }
        else
          for i := 0 to numOfDMRec do
            with DMRecsPtr^[i] do
              begin
                if state = on then
                  if DMTypes[typeIdx].codeRes then
                    callResDM(massageDM, DMRecsPtr^[i], DMInfo, massageProc)
                  else
                    callMassage(DMRecsPtr^[i], massageProc);
                if dispLast then
                  for j := 0 to outputs - 1 do
                    with PointsOut[j] do
                      begin
                        case outType of
                          intD:
                            value := LastValue.i;
                          longD:
                            value := LastValue.l;
                          fixedD:
                            value := HiWord(LastValue.f);
                          realD:
                            value := Round(LastValue.r);
                          otherwise
                            value := -2;
                        end;
                        DMSlotDesc.dataPtr^[dispIdx + j] := value;
```

```
            end;
        end;  { for each DM }

    for i := 1 to ScriptListIdx do                { If there are any scripts that should be executed }
      if not ExScriptName(ScriptList[i]) then     { then execute them. }
        Announce(StringOf('Script "', ScriptList[i], '" not found.'));
    if recMassOn then
      doRecord;
    if not turnkey then
      SlotText(DMSlotDesc);
  end;    { DataMassage }

  procedure DescribeDMs (var out: Text; fileName: string);
{ Print a description of the Data Massage modules currently installed to the passed text file. }
    var
      i, j: integer;
      str: string;
  begin
    writeln(out);
    write(out, 'Data Massage Modules');
    if fileName <> '' then
      write(out, ' for "', fileName, '"');
    writeln(out, ':');
    writeln(out);
    if numOfDMRec < 0 then
      writeln(out, 'No Data Massage modules are installed.')
    else
      begin
        for i := 0 to numOfDMRec do
          with DMRecsPtr^[i] do
            begin
              describeStr := '';
              doVerb(describeDM, DMRecsPtr^[i]);
              writeln(out, 'DM "', name, '", ', state, ', ', DMTypes[typeIdx].name, '.');
              if describeStr <> '' then
                writeln(out, ' ', describeStr);
              for j := 0 to 5 do
                begin
                  str := '';
                  if j <= inputs - 1 then
                    with SlotsIn[j] do
                      begin
                        str := StringOf(' In: ', kind, ', ', name);
                        if kind = frmDM then
                          str := StringOf(str, ' ', inIdx + 1 : 1)
                        else if kind = frmTree then
                          str := StringOf(str, ' ', SixAxisType(inIdx));
                      end;
                  while length(str) < 30 do
                    str := concat(str, ' ');
                  if j <= outputs - 1 then
                    with PointsOut[j] do
                      if name <> '' then
```

T

```
                str := StringOf(str, ' Out: ', name, ', ', SixAxis);
             if (j <= inputs - 1) or (j <= outputs - 1) then
               writeln(out, str);
           end;      { for inputs/ outputs. }
         writeln(out);
       end;      { for each DM. }
    end;
  end;             { Describe DMs }

  procedure DescribeDMTypes (var out: Text);
{ Print a description of the Data Massage types currently installed to the passed text file. }
   var
    i, j: integer;
    str: string;
    strp: StringPtr;
    h: Handle;
  begin
   writeln(out);
   write(out, 'Data Massage Types');
   writeln(out, ':');
   writeln(out);
   for i := 0 to topDMType - 1 do
    with DMTypes[i] do
     begin
      writeln(out, name, ':');
      h := GetNamedResource('STR ', name);
      writeln(out, InOutCountStr(inputs, outputs));
      if h <> nil then
       begin
        strp := StringHandle(h)^;
        writeln(out, strp^);
        writeln(out);
        ReleaseResource(h);
       end;      { for each DM. }
     end;
  end;             { Describe DMs }

  procedure doDMMenu;
  begin
   case Item_No of
    OpenMItem:
     LoadMassaged(0);
    SaveMItem:
     SaveMassaged(0);      { 0 says prompt for file and save tree and data. }
    RecMItem:
     ChangeRecMass(not RecMassOn);
    PlayMItem:
     ChangePlayMass(not PlayMassOn);
    AddDMItem:
     if AddDMmodule(true) then
      ;
    DelDMItem:
     EditDMList;
```

```
    TurnOffDMItem:
      begin
        doAllDMs := not doAllDMs;
        CheckItem(DMMHndl, TurnOffDMItem, not doAllDMs);
        if doAllDMs then
          ReOrderDMs(true);
      end;
    otherwise
      sysbeep(3);
   end;      { case }
 end; { doDMMenu }

{ File I/O is now in DMFileIO.pas so these routines just pass on the calls. }
 function OpenDMs; { (vref : integer; fname : string; merge : boolean) : integer; }
 begin
   OpenDMs := dmioOpenDMs(vref, fname, merge);
 end;
 function SaveDMs; { (vref : integer; fname : string) : integer }

 begin
   SaveDMs := dmioSaveDMs(vref, fname);
 end;

 procedure CompactDMs;
   { Compact memory by moving things around to make the freespace as large as possible. }
   var
     i, err: integer;
     l: longInt;
     h: handle;
   function k (b: longInt): string;
   begin
     k := StringOf(b / 1024 : 5 : 1, 'k');
   end;
   procedure MoveUp (h: Handle);
   begin
     HUnlock(h);
     MoveHHi(h);
     HLock(h);
   end;

 begin
   Announce(StringOf('FreeMem = ', k(FreeMem), ', Largest = ', k(MaxMem(l))));
   for i := 0 to numOfDMRec do
     with DMRecsPtr^[i] do
       if private <> nil then
         begin
           h := RecoverHandle(private);
           err := ResError;
           if (h = nil) or (err <> noErr) then
             begin
               Announce(StringOf('CompactDMs: got an error ', err : 1, ' trying to recover private handle
     for ', name, '.'));
             end
```

```
        else
          begin
            MoveUp(h);
            private := StripAddress(h^);
          end;
        end;
  { Move the DM array up in memory. }
  h := RecoverHandle(Ptr(DMRecsPtr));
  MoveUp(h);
  DMRecsPtr := Pointer(StripAddress(h^));
  { Move the generated code up in memory. }
  MoveUp(Handle(CodeHandle));
  DMCodeInvalid := true;
  { Move the recorded tree array. }
  MoveUp(RecoverHandle(Pointer(RecTreePtr)));
  RecTreePtr := Pointer(StripAddress(h^));

  reHookupDMIO;
  Announce(StringOf('FreeMem = ', k(FreeMem), ', Largest = ', k(MaxMem(l))));
 end;

 procedure ShowDMInfo;
{ Write in the announce window information about current DM usage. }
  var
   i: integer;
   l, psize: longInt;
   h: handle;
 begin
  psize := 0;
  for i := 0 to numOfDMRec do
   if DMRecsPtr^[i].private <> nil then
    begin
     l := GetPtrSize(DMRecsPtr^[i].private);
     if l <= 0 then
      begin
       h := RecoverHandle(DMRecsPtr^[i].private);
       l := GetHandleSize(h);
      end;
     psize := psize + l;
    end;

  Announce(StringOf('DM info: Num of DMs: ', numOfDMRec + 1 : 1, ', Num of DM types: ', topDMType :
      1));
{$ifc Debug }
  Announce(StringOf('DM array has ', maxDMRec : 1, ' elements, ', sizeof(DMRec) * maxDMRec : 1, '
      bytes, private size = ', psize : 1, ' bytes.'));
  Announce(StringOf('DM code is at $', HexLong(ord4(CodeHandle^)), ' and is ', NextWord div 2 : 1, '
      bytes long.  CallDMCode = ', CallDMCode));
  Announce(StringOf('Largest mem block = $', Ptr(MaxMem(l)), ', Total free = $', Ptr(FreeMem)));
{$endc }
 end;

  { Have the selected DM's describe themselves. }
```

```
procedure DescribeSelected;
  var
    pi: PicInfoHandle;
  procedure describe (var dm: DMRec; flexH: FlexHandle);
  begin
    DescribeStr := '';
    doVerb(DescribeDM, dm);
    with dm do
      Announce(StringOf(' DM "', name, '", ', state, ', ', DMTypes[typeIdx].name, ' ', DescribeStr, ', pvt:
       ', private));
  end;
begin
  Announce('Selected DM''s');
  dotoSelec(describe);
  Announce('Selected pictures');
  pi := PicSelRoot;
  while pi <> nil do
    begin
      HLock(Handle(pi));
      with pi^^, pi^^.bounds do
        Announce(StringOf(' pic: $', pic, ' $', pic^, ', id: ', id : 1, ', Rect: ', top : 1, ' ', left : 1, ' ', bottom
      : 1, ' ', right : 1));
      HUnlock(Handle(pi));
      pi := pi^^.nextsel;
    end;
end;

procedure FlexKey; { (key: char) }
  { The given key has been hit in the flex window. }
  const
    BackSpaceKey = char(8);
    ClearKey = char(27);
  var
    sec, hz: real;
    frames: integer;
begin
  case key of
    'i', 'I':
      ShowDMInfo;
    'd', 'D':
      DescribeSelected;
{$ifc Debug }
    'µ':       { option-m }
      CompactDMs;
    'r', 'R':
      begin
        ReorderDMs(true);
        FlexRedo(true);   { Redo the flex window, saving current selection. }
      end;
    'f', 'F':
      begin
        reHookupDMIO;
        FlexRedo(true);   { Redo the flex window, saving current selection. }
```

```
      end;
{$endc }
    BackSpaceKey, ClearKey:
      FlexEdit(6);       { Just like Edit/Clear }
    't', 'T':
      begin
        sec := (Ticks^ - TimeJiffy) / 60;
        hz := TimeInc / sec;
        Announce(StringOf(TimeInc : 1, ' frames in ', sec : 2 : 2, ' seconds.  Average ', hz : 1 : 1, ' hz. '));
        TimeInc := 0;
        hz := (OutCountPtr^ - OutInc) / sec;
        Announce(StringOf((OutCountPtr^ - OutInc) : 1, ' output frames in ', sec : 2 : 2, ' seconds.  Average
      ', hz : 1 : 1, ' hz. '));
        OutInc := OutCountPtr^;
        TimeJiffy := TickCount;
      end;
    '?':
      begin
        Announce('i - Show DM Info, d - Describe selected DM''s, t - Time Loop.');
{$ifc Debug }
        Announce('f -Redraw Flex window, r - Reorder DM''s , opt m - Compact Mem.');
{$endc }
      end;
    end;
  end;

{$ifc Profile_On }
{ These routines are here because this seg will never be swapped out.  They only exist if compiling with }
{ the Profile_On option set to true. }
  procedure do_InitProfile;
  begin
    InitProfile;
  end;
  procedure do_ResetProfile; { (dyItem: integer) }
  begin
    ResetProfile;
  end;
  procedure do_DumpProfile; { (dyItem: integer) }
  begin
    ShowText;
    DumpProfile;
  end;
{$endc }

end.
```

```
program DataSuit;

{ DataSuit main program. }

{  By Chuck Blanchard,  7/13/87}
{  Copyright 1985 VPL Research, Inc.  All rights reserved}

{ 12/13/88 - Converted to LSP 2.0.  Added the compiler option Profile_On that enables compiling of the }
{ profiler.  Since it takes so much global space I had to cut down on the size of some of my global }
{ arrays. }

{$ifc Profile_On }
  uses
    Profiler,
{$elsec }
  uses
{$endc }
    CompileTime, ChuckStuff, FastStuff, AutoLib, Globals, Tree3DGlob,{}
    miscRoutines, serialTypes, PollO, RawUnit, ChucksDAs, DataAqUnit, formTree3D, TreeRender, Tree3D,
        {}
    DMTypes, DMGlobals, Flex, DMFileIO, DataMassage, FileIO, Scripts, HostCom, {}
    SGICom, initMIDI, InitMacUnit, Initialize;

{ Turn off initialization so I can check for 68881. }
{$I- }

  function IsMyWindow (wptr: WindowPtr; var wtype: myWindowTypes): boolean;
    var
      wt: myWindowTypes;
  begin
    IsMyWindow := false;
    for wt := DataW to LiveW do
      if wptr = myWindows[wt].wptr then
        begin
          wtype := wt;
          IsMyWindow := true;
        end;
  end;

  procedure doDialog (Item: Integer);
{ show either the about or Help window.  The user has selected}
{   About ... or Instructions from the Apple menu. }
    var
      dlogPtr: DialogPtr;
      i: Integer;
      strh: StringHandle;
  begin
    if Item = 2 then
      i := HelpID
    else
      begin
        i := AboutID;
        ParamText('It''s not nice to mess around with us Wireframes!', '', '', '');
```

```
      strh := StringHandle(GetResource(AppType, 0));
      ParamText(strh^^, '', '', '');
    end;
   dlogPtr := GetNewDialog(i, nil, Pointer(-1));
   PositionWindow(dlogPtr, 50, 30);
   ShowWindow(dlogPtr);
   repeat
    ModalDialog(nil, i);
   until (i = 3) or (i = 1);
   DisposDialog(dlogPtr);
  end; { doDialog }

  procedure ProcessMenu_in (CodeWord: longint);
{ Proccess a menu select. }
   var
    Menu_No: integer;        {menu number that was selected}
    Item_No: integer;        {item in menu that was selected}
    tStr: Str255;            {name holder for desk accessory or font}
    DNA: integer;            {OpenDA will never return 0, so don't care}

   procedure treeWind (tog: boolean);
   begin
    TreeWindow(mainTreePtr, tog);
   end;

   procedure WindowTog (wPtr: WindowPtr; procedure windSetProc (on: boolean));
{ Change the state of this window.  If it is off then call windSetProc(true) to turn }
{ the window on.  If it is on and frontmost then call windSetProc(false) to turn it off, }
{ otherwise just bring it to the front and don't call windSetProc. }
   begin
    if WindowOn(wPtr) then
     begin
      if (FrontWindow = wPtr) then
       windSetProc(false)
      else
       SelectWindow(wPtr);
     end
    else
     windSetProc(true);
   end;

  begin
   if CodeWord <> 0 then
    begin {go ahead and process the command}
     Menu_No := HiWord(CodeWord);   {get the Hi word of...}
     Item_no := LoWord(CodeWord);   {get the Lo word of...}

     if not dyMenuID(Menu_No, Item_No) then    { if this is a dynamic menu do it. }
      case Menu_No of
       AppleMenu:
        begin
         if Item_No <= 2 then
          doDialog(Item_No) { about or help }
```

```
          else
            begin { handle a desk acc }
              GetItem(GetMHandle(AppleMenu), Item_No, tStr);
              DNA := OpenDeskAcc(tStr);
            end;  { desk accessory }
        end;  { AppleMenu }
      FileMenu:
        doFileMenu(Item_No);
      File2Menu:
        case Item_No of
          HReset2Item:
            executeMenu(DAMenu, ResetDAItem);
          Config2Item:
            doFileQuit;
        end;
      EditMenu:
        begin
          if not SystemEdit(Item_no - 1) then {if not for a desk accessory}
            if turnkey then
              sysbeep(3)
            else if FrontWindow = mainTreePtr^.wp then
              TreeEdit(mainTreePtr, Item_No)
            else if FrontWindow = FlexWPtr then
              FlexEdit(Item_No);
        end;   { EditMenu }
      DAMenu:
        doDAMenu(Item_No);
      DMMenu:
        doDMMenu(Item_No);
      TreeMenu:
        begin
          doTreeMenu(mainTreePtr, Item_No);
        end;
      ScriptMenu:
        doScriptMenu(item_No);
      WindowMenu:
        case Item_No of
          TreeWItem:
            windowTog(mainTreePtr^.wp, treeWind);
          RawWItem:
            windowTog(RawDesc.wp, RawWindow);
        end;
    end;   { Menu case }
    HiliteMenu(0);              {unhilite after processing menu}
  end;  { if CodeWord <> 0 }
end; {of ProcessMenu_in procedure}


{-----------------------------------------------------------------}
{----- These are procedures called from the main event loop  -------}

procedure DealwthMouseDowns (Event: EventRecord);
  var
```

```
    Location: integer;
    WindowPointedTo: WindowPtr;
    MouseLoc: Point;
    WindoLoc: integer;
    l: longInt;
    r: Rect;
  begin
   SetFileMenus;    { Set the appearence of the file menus. }
   MouseLoc := Event.Where;
   WindoLoc := FindWindow(MouseLoc, WindowPointedTo);
   case WindoLoc of

    inMenuBar:
     ProcessMenu_in(MenuSelect(MouseLoc));

    inSysWindow:
     SystemClick(Event, WindowPointedTo);

    inContent:
     if (BitAnd(Event.modifiers, optionKey) <> 0) or (WindowPointedTo = FrontWindow) then
      begin {do something}
       if WindowPointedTo = mainTreePtr^.wp then
        TreeMouse(mainTreePtr, Event)
       else if WindowPointedTo = RawDesc.wp then
        SlotMouse(RawDesc, Event)
       else if WindowPointedTo = DMSlotDesc.wp then
        SlotMouse(DMSlotDesc, Event)
       else if WindowPointedTo = FlexWPtr then
        FlexMouse(event);
      end
     else if WindowPointedTo <> FrontWindow then
      SelectWindow(WindowPointedTo);

    inGrow:
     if WindowPointedTo <> FrontWindow then
      SelectWindow(WindowPointedTo)
     else
      begin
       SetPort(WindowPointedTo);
       l := GrowWindow(WindowPointedTo, MouseLoc, GrowArea);
       if l <> 0 then
        with WindowPointedTo^.portRect do
         begin
          SetRect(r, left, bottom - 16, right, bottom);
          InvalRect(r);
          SetRect(r, right - 16, top, right, bottom);
          InvalRect(r);
          SizeWindow(WindowPointedTo, loWord(l), hiWord(l), true);
          SetRect(r, left, bottom - 16, right, bottom);
          InvalRect(r);
          SetRect(r, right - 16, top, right, bottom);
          InvalRect(r);
          if WindowPointedTo = RawDesc.wp then
```

```
              ResizeSlotW(RawDesc)
            else if WindowPointedTo = DMSlotDesc.wp then
              ResizeSlotW(DMSlotDesc)
            else if WindowPointedTo = FlexWPtr then
              FlexResize
            else if WindowPointedTo = mainTreePtr^.wp then
              TreeWResize(mainTreePtr);
          end;
      end;

    inDrag:
      DragWindow(WindowPointedTo, MouseLoc, DragArea);

    inGoAway:
      if TrackGoAway(WindowPointedTo, MouseLoc) then
        begin
          if WindowPointedTo = mainTreePtr^.wp then
            TreeWindow(mainTreePtr, false)
          else if WindowPointedTo = RawDesc.wp then
            RawWindow(false)
          else if WindowPointedTo = DMSlotDesc.wp then
            DMWindow(false)
          else if WindowPointedTo = FlexWPtr then
            FlexWindow(false);
        end;

    inZoomIn, inZoomOut:
      if TrackBox(WindowPointedTo, MouseLoc, WindoLoc) then
        begin
          ZoomWindow(WindowPointedTo, WindoLoc, true);
          SetPort(WindowPointedTo);
          if WindowPointedTo = mainTreePtr^.wp then
            begin
              InvalRect(mainTreePtr^.wp^.portRect);
              TreeWResize(mainTreePtr);
            end
          else if WindowPointedTo = FlexWPtr then
            begin
              InvalRect(FlexWPtr^.portRect);
              FlexResize;
            end
        end;

    inDesk:
      ;
  end;{ of case}
end;

{-----------------------------------------------------------------------}

procedure DealwthKeyDowns (Event: EventRecord);
  var
    CharCode: char;
```

```
  begin
    CharCode := chr(bitAnd(Event.message, $FF));
    if BitAnd(Event.modifiers, CmdKey) = CmdKey then
      begin
        {key board command - probably a menu command}
        ProcessMenu_in(MenuKey(CharCode));
      end
    else if not turnKey then
      begin  {regular keyboard entry}
        LastKey := ord(CharCode);      { Set value for KeyBoard DA entry. }
        if FrontWindow = mainTreePtr^.wp then
          TreeKey(mainTreePtr, CharCode)
        else if FrontWindow = RawDesc.wp then
          LoopKey(CharCode)
        else if FrontWindow = FlexWPtr then
          FlexKey(CharCode)
      end;
  end;

{---------------------------------------------------------------------}

  procedure DealwthActivates (Event: EventRecord);
    var
      TargetWindow: WindowPtr;
      wp: WindowPeek;
      i: integer;
      b, fileon: boolean;
      wtype: myWindowTypes;

    procedure EditOn (on: boolean);
{ Turn the standard edit menu items on or off. }
      var
        i: integer;
    begin
      EnDisItem(EditMHndl, 1, false);
      for i := 2 to 6 do
        if i <> 2 then     { line divider }
          EnDisItem(EditMHndl, i, on);
    end;       { EditOn }

  begin
    TargetWindow := WindowPtr(Event.message);
    if Odd(Event.modifiers) then
      begin
        { the window is becoming active}
        SetPort(TargetWindow);
      end
    else
      begin
        {deactivate whatever you need}
      end;
    if TargetWindow = RawDesc.wp then
      SlotActivate(RawDesc, Odd(Event.modifiers))
```

```
    else if TargetWindow = DMSlotDesc.wp then
      SlotActivate(DMSlotDesc, Odd(Event.modifiers))
    else if TargetWindow = FlexWPtr then
      FlexActivate(Odd(Event.modifiers))
    else if (TargetWindow = mainTreePtr^.wp) then
      begin
        TreeWResize(mainTreePtr);
        DrawGrowIcon(TargetWindow);
      end;
    b := true;
    fileon := true;
    if IsMyWindow(FrontWindow, wtype) then
      b := myWindows[wtype].useEdit
    else
      fileon := false;
    EditOn(b);
  end;    { DealwthActivates }

{---------------------------------------------------------------------------}
  procedure DealwthUpdates (Event: EventRecord);
    var
      UpDateWindow, TempPort: WindowPtr;
  begin
    UpDateWindow := WindowPtr(Event.message);
    GetPort(TempPort);              {Save the current port}

    SetPort(UpDateWindow);      {set the port to one in Evt.msg}
    BeginUpDate(UpDateWindow);
    if UpdateWindow = mainTreePtr^.wp then
      TreeUpdate(mainTreePtr)
    else if UpdateWindow = RawDesc.wp then
      SlotUpdate(RawDesc)
    else if UpdateWindow = DMSlotDesc.wp then
      SlotUpdate(DMSlotDesc)
    else if UpdateWindow = FlexWPtr then
      FlexUpdate
    else if UpdateWindow = messWPtr then
      if MessOffPort.portBits.baseAddr <> nil then
        begin
          with messWPtr^ do
            CopyBits(MessOffPort.portBits, portBits, portRect, portRect, srcCopy, nil);
        end;
    EndUpDate(UpDateWindow);
    SetPort(TempPort);             {restore to the previous port}
  end;

{---------------------------------------------------------------------------}

  procedure MainEventLoop;
    var
      Event: EventRecord;
      ProcessIt, bool: Boolean;
      dptr: DialogPtr;
```

```
    itemHit: integer;
    nextget, fastTill: longInt;
    EventsToHandle: integer;
  begin
    EventsToHandle := BitAnd(EveryEvent, BitNot(diskMask + networkMask + driverMask));
    EventsToHandle := EveryEvent;
    nextget := 0;
    fastTill := 0;
    LastUpTick := 0;
    repeat
      if (Ticks^ > nextget) or (Ticks^ < fastTill) then
        begin
          SystemTask;          { so you can support Desk Accessories}
          ProcessIt := GetNextEvent(EventsToHandle, Event);
          nextget := Ticks^ + 6;     { only check for events every 10hz. }
        end
      else
        ProcessIt := false;
      if ProcessIt then
        begin
          bool := IsDialogEvent(event);
          if bool and (Event.what <> app1Evt) then
            begin { This event is to a modeless dialog box. }
              if (event.what = KeyDown) and (BitAnd(Event.modifiers, CmdKey) = CmdKey) then
                DealwthKeyDowns(event)   { is a cmd-key, so pass it on. }
              else
                begin
                  if event.what = activateEvt then
                    DealwthActivates(Event);
                  bool := DialogSelect(event, dptr, itemHit);
                end;
            end
          else if not isAutoWind(Event) then
            case Event.what of
              mouseDown:
                begin
                  fastTill := Ticks^ + 120; { do fast user Input for next two seconds. }
                  DealwthMouseDowns(Event);
                end;
              mouseUp:
                LastUpTick := Event.when;
              autoKey, KeyDown:
                DealwthKeyDowns(Event);
              ActivateEvt:
                DealwthActivates(Event);
              UpDateEvt:
                DealwthUpdates(Event);
              app1Evt:
                case bitAnd(Event.message, $FF) of
                  RawPlayOffMsg:
                    ChangeRecMass(false);
                  ExStartupMsg:
                    ExScriptStartup(Event.message);
```

```
            4:  { should be LoadedTreeMsg }
              begin
                DirtyTreeWalk(mainTreePtr^.TreeRoot, true);
{$ifc for_SGIs }
                NeedNewIsaac;    { }
{$endc }
              end;
            otherwise
              announce('funky doodle app1 event!');
          end;
        otherwise
          ;
      end;{of Case}
    end { if ProccessIt true }
  else
    begin { if no Mac events, then do our own stuff. }
      if HookupFlag then
        begin
          HookupFlag := false;
{   Announce('HookUpDMFlag'); }
          reHookupDMIO;      { Rehook up the DM's without sorting them. }
          FlexRedo(true);    { Show any changes in the flex window. }
{$ifc for_SGIs }
          rehookupSGI;       { And resend the tree to the SGI's if nessesary }
{$endc }
        end
      else
        begin
          DataAcquisition;
          DataMassage;
          TreeRender(mainTreePtr);

{$ifc DoHost }
          CheckHost;
{$endc}
{$ifc for_SGIs }
          CheckSGI;
{$endc}
        end;
    end;     { If no Mac events }
  until Finished; {terminate the program}
 end;

{-----------------------------------------------------------------------}

 procedure CloseThings;
 begin
  {close files, if you changed sys resources, UNchange them here be carefull}
  {about changing sys things, remember the Switcher could be around}

  UseResFile(ApplRes);
{$ifc for_SGIs }
  CloseSGI;
```

```
{$endc}

    CloseScripts;
    QuitDataAq;
    Close3D;
    CloseDataMs;
    ResetMIDI;
        {this procedure resets the serial port buffers so that there is no chance of a random crash}
        {due to funky buffer size.}
    ResetPolhemusBuffers;
    CloseAnnounce;

{$ifc Profile_On }
    TerminateProfile;
{$endc }
  end;

{--------------------------------------------------------------------------}

begin  { Main }
  Ticks := Pointer($16a);
  Finished := False;           {set program terminator to false}
  InitMac;                     { Initialize Mac toolbox. }
  SetApplRes;                  { Set the applications resource file number. }
  turnKey := false;
  CheckSysEnvirons;
  SetDAConfig;
  InitThings;
  if not Finished then
    begin
      processMenu_Addr := @ProcessMenu_In;
      if not finished then
        SetUpThings;
      UnLoadSeg(@SetUpThings);
      while not finished do
        begin
          MainEventLoop;
          finished := CloseFileIO;
        end;
      CloseThings;
    end;
end.
```

```
{ This unit has a DM module to set the brightness of the DG2 box based on }
{ saturation for the fingers in the range given by the two inputs to the module. }
{ Also a DM has been added to write a byte out to an I/O port on the DataFlash box }
{ for diagnostic purposes. }

unit DG2Bright;
interface
  uses
    ChuckStuff, iop_calls, AutoLib, Globals, Tree3DGlob, FastStuff, MiscRoutines, serialTypes,
        serialRoutines, {}
    RawUnit, DAGloveIO, gloveIOandDMs, DataAqUnit, DMTypes, DMGlobals;


  procedure doDG2Bright (var dm: DMRec);
  procedure HandleDG2Bright (v: DMVerb; var dm: DMRec);

  procedure doDFWrite (var dm: DMRec);
  procedure HandleDFWrite (v: DMVerb; var dm: DMRec);

implementation

  type
{ Private storage for a DG2Bright DM. }
    BrightPvtType = record
        level, drop: integer;
      end;
    BrightPvtPtr = ^BrightPvtType;

{ Private storage for a DFWrite DM. }
    DFWritePvtType = record
        port, value: integer;
      end;
    DFWritePvtPtr = ^DFWritePvtType;

{---------------------------------------}
{ DGII Brightness. Set the intensity of the DGII box based on the the range of }
{ raw values pointed to by input1-input2. Keep the intensity values and reset the }
{ box when read in from a file or CalibHalf 1. }

  procedure doDG2Bright; { (var dm : DMRec) }
{ This DM does nothing in it's massaging part. Just on initialize, calibrate, Fopen. }
  begin
  end;
{ HandleDGIIBright has all the routines nessessary to set the DGII box's brightness }
{ intensity. }
  procedure HandleDG2Bright;    {•(v  :  DMVerb;•}
                               {•     var dm : DMRec);•}

    var
      i: integer;
      h: handle;
      sptr: BrightPvtPtr;
```

```
function boxNum (var dm: DMRec): integer;
  var
    start, stop, i: integer;
begin
  boxNum := -1;
  if (dm.SlotsIn[0].kind <> frmRaw) or (dm.SlotsIn[1].kind <> frmRaw) then
    Announce('This DM''s inputs must be a range in the Raw array.')
  else if (ord4(dm.SlotsIn[0].ptrfrm) > ord4(dm.SlotsIn[1].ptrfrm)) then
    Announce('The first input must be less than the second to define a range.')
  else
    begin    { Figure out which glove box this is. }
      with dm.SlotsIn[0] do
        start := FindRaw(name, @ptrfrm^.i);
      with dm.SlotsIn[1] do
        stop := FindRaw(name, @ptrfrm^.i);
      for i := 1 to numGloves do
        with gBoxes[i]^.serBlock.dar do
          begin
            if (FirstSlot < start) and (FirstSlot + Size >= stop) then
              begin
                boxNum := i;
                leave;
              end;
          end;
    end;
end;

procedure Calibrate (var dm: DMRec; prompt: boolean);
{ Set the DGII brightness.  Bring it all the way up, then drop it until }
{ all the sensors in the range have dropped by sptr^.drop. }
  var
    l, t: longint;
    sptr: BrightPvtPtr;
    str1, str2: str255;
    i, level, start, stop, index: integer;
    initial: array[0..20] of integer;
    done, ok: boolean;
begin
  sptr := BrightPvtPtr(dm.private);
  NumtoString(sptr^.drop, str1);
  index := boxNum(dm);

  if index >= 1 then
    begin
      if not prompt then
        done := false
      else
        begin
          str1 := StringOf(sptr^.drop : 1);
          if GetStrings('Enter drop value and straighten the test joints.', '', str1, str2) then
            begin
              done := false;
              sptr^.drop := StringtoInt(str1);
```

```
            end
          else
            done := true;
        end;
      if not done then
        if gBoxes[index]^.serBlock.dar.state <> DAon then
          Announce('The DG2 box isn''t on.');
      if not done then
        begin
          with dm.SlotsIn[0] do
            start := FindRaw(name, @ptrfrm^.i);
          with dm.SlotsIn[1] do
            stop := FindRaw(name, @ptrfrm^.i);
          level := 0;
          ok := SetBright(gBoxes[index], level);
          AcquireRefresh;
          t := Ticks^;
          repeat
          until Ticks^ > t + 2;
          for i := 1 to 3 do
            AcquireRefresh;
          for i := start to stop do
            initial[i - start] := RawData[i] - sptr^.drop;
          while not done and ok and (level < 127) do
            begin
              level := level + 2;
              ok := SetBright(gBoxes[index], level);
              AcquireRefresh;
              AcquireRefresh;
              done := true;
              for i := start to stop do
                if initial[i - start] < RawData[i] then
                  done := false;
            end;
          if not ok then
            Announce('Setbright returned an error.')
          else if done then
            begin
              sptr^.level := level;
              FileDirty[dmFile] := true;
              Announce('Brightness level set.');
            end
          else
            Announce('Level didn''t seem to affect the range. ');
        end;  { if not prompt or user said OK. }
    end;      { if everything checked out ok. }
  if prompt then
    sysbeep(3);
end;

begin
  case v of
    initDM:          { Called once the first time this DM is started. }
```

```
begin
  if dm.private <> nil then
    doClose(dm);
  h := NewHandle(sizeof(BrightPvtType));
  if h <> nil then
    begin
      MoveHHi(h);
      HLock(h);
      dm.private := h^;
      sptr := BrightPvtPtr(dm.private);
      sptr^.drop := 10;
      sptr^.level := 0;
      Calibrate(dm, true);
    end
  else
    begin
      Announce('Not enough memory to open this DM.');
      dm.state := usrOff;
    end;
end;
closeDM:           { Called when this module is deleted.  Do whatever... }
  doClose(dm);
reHookedDM:
  ;                { DM has been re-hooked up.  who cares? }
fopenDM:           { This DM has just been read from a file.  If it's state is }
                   { on it was hooked up properly.  private points to the }
  begin            { private memory it had when saved. }
    sptr := BrightPvtPtr(dm.private);
    i := boxNum(dm);
    if i >= 1 then
      if SetBright(gBoxes[i], sptr^.level) then
        ;
  end;
fsaveDM:           { This DM is about to be saved to a file.  Do any changes }
  begin            { nessessary to private memory so it can be restored later. }
  end;
calibDM:           { Calibrate the DM module. }
  begin
    Calibrate(dm, true);
  end;
describeDM:        { put a description into describeStr }
  begin
    sptr := BrightPvtPtr(dm.private);
    describeStr := StringOf('Drop: ', sptr^.drop);
    describeStr := StringOf(describeStr, ', Brightness Level: ', sptr^.level : 1);
  end;
CalibPartDM:
  Calibrate(dm, false);
writeCodeDM:
  ;
otherwise          { Should be no other. }
  sysbeep(3);
end;    { case }
```

```
  end;        { HandleDG2Bright }

  procedure doDFWrite; { (var dm : DMRec) }
{ This DM does nothing in it's massaging part.  Just on calibrate. }
  begin
  end;
{ HandleDFWrite has all the routines nessessary to write a byte out one of the I/O }
{ ports on the DataFlash box. }
  procedure HandleDFWrite;  {•(v  :  DMVerb;•}
                            {•     var dm : DMRec);•}

    var
      i: integer;
      h: handle;
      sptr: DFWritePvtPtr;

    procedure Calibrate (var dm: DMRec);
      var { calibrate this DFWrite dm. }
        sptr: DFWritePvtPtr;
        prompt1, str1, str2: str255;
        i: integer;
    begin
      sptr := DFWritePvtPtr(dm.private);
      prompt1 := concat('Scale/Offset DM module "', dm.name, '".');
      prompt1 := concat(prompt1, chr(13), 'Enter the new DataFlash I/O port:');
      if sptr = nil then
        Announce('Error, private pointer is nil.')
      else
        begin
          str1 := ntos(sptr^.port);
          str2 := ntos(sptr^.value);
          if GetStrings(prompt1, 'And the new value to write:', str1, str2) then
            with sptr^ do
              begin
                if str1 <> '' then
                  port := StringtoInt(str1);
                if str2 <> '' then
                  value := StringtoInt(str2);
                FileDirty[dmFile] := true;
                port := minMaxOf(0, port, 255);
                value := minMaxOf(0, value, 255);
                i := Write_io_port(port, value);
                if i <> noErr then
                  AnnounceB(StringOf('DataFlash returned ', i : 1));
              end;
        end;
    end;

  begin
    case v of
      initDM:           { Called once the first time this DM is started. }
        begin
          if dm.private <> nil then
```

```
        doClose(dm);
      h := NewHandle(sizeof(DFWritePvtType));
      if h <> nil then
        begin
          MoveHHi(h);
          HLock(h);
          dm.private := h^;
          sptr := DFWritePvtPtr(dm.private);
          sptr^.port := 0;
          sptr^.value := 0;
          Calibrate(dm);
        end
      else
        begin
          Announce('Not enough memory to open this DFWrite DM');
          dm.state := usrOff;
        end;
    end;
  massageDM:
    ;      { Called once through the main loop. do a massage }
  closeDM:          { Called when this module is deleted. Do whatever... }
    doClose(dm);
  reHookedDM:
    ;               { DM has been re-hooked up. who cares? }
  fopenDM:          { This DM has just been read from a file. If it's state is }
                    { on it was hooked up properly. private points to the }
    begin           { private memory it had when saved. }
    end;
  fsaveDM:          { This DM is about to be saved to a file. Do any changes }
    begin           { nessessary to private memory so it can be restored later. }
    end;
  calibDM:          { Calibrate the DM module. }
    begin
      Calibrate(dm);
    end;
  describeDM:       { put a description into describeStr }
    begin
      sptr := DFWritePvtPtr(dm.private);
      describeStr := StringOf('Port: ', sptr^.port : 1);
      describeStr := StringOf(describeStr, ', Byte: ', sptr^.value : 1);
    end;
  writeCodeDM:
    ;
  otherwise         { Should be no other. }
    sysbeep(3);
  end;      { case }
end;        { HandleDFWrite }

end.
```

```
{-------------------------------------------}
{  Put up a dialog box to edit name, inputs,  }
{  output, and type of a DM module.            }
{-------------------------------------------}

unit DMEdit;
interface
  uses
    AutoLib, ChuckStuff, Globals, Tree3DGlob, MiscRoutines, RawUnit, {}
    formTree3D, Tree3D, DMTypes, DMGlobals, HandleDMs;

  function InOutCountStr (incnt, outcnt: integer): string;

  function SetDMOutput (var dm: DMRec): boolean;

  function EditDMmodule (var dm: DMRec): boolean;


implementation
  const
    DMmodID = 2006;          { DM record dialog box }
    NameItem = 5;
    NameEdItem = 1;          { name is first editText item in the dialog }

    DMOnItem = 6;              { On/Off check box. }

    DMkindItem = 7;            { the items from here }
    DMinRTItem = 8;
    DMinNameItem = 9;
    DMinSixItem = 10;
    DMoutNameItem = 11;
    DMoutSixItem = 12;
    DMioListItem = 13;         { to here are lists. }

    DMIOnumItem = 20;          { number of inputs, number of outputs. }
    IOnumTextItem = 3;         { num of inputs, outputs is the 3'rd static text item in the dialog box. }

    DMioXItem = 14;
    DMioYItem = 15;
    DMioZItem = 16;
    DMioYawItem = 17;
    DMioPitchItem = 18;
    DMioRollItem = 19;
    DMioRawItem = 21;
    DMioTreeItem = 22;
    DMioDMItem = 23;
    DisplayItem = 24;          { Check box for Display in DM window }

    popUpItemNo = 25;
    groupNameItem = 26;
    DescTextItem = 27;         { DM description text is the 27'th item in the dialog box. }
    DMLinesItem = 28;          { Check box for DMLines }
```

```
type
  listSet = set of DMkindItem..DMioListItem;
var
  DMListInfo: array[DMkindItem..DMioListItem] of record  { for all the list }
      lH: ListHandle;                                      { handle and }
      box: Rect;                                       { enclosing rect. }
    end;
  newSelect: integer;
  inputLists, outputLists: listSet;
  autoName: boolean;          { If true generate DM names when switching types. }
                                 { True as long as the name was '' on entry and the user hasn't typed. }

  popUpItem: Handle;
  itemType: integer;
  itemBox: Rect;
  dlogPtr: DialogPtr;
  HelpRect: Rect;             { Rectangle the help is drawn into. }
  DMtypename: NameStr;        { used by the help draw routine to find the help. }

  start, stop: integer;

function InOutCountStr (incnt, outcnt: integer): string;
  var
    str: string;
begin
  case incnt of
    -1:
      str := 'Any inputs, ';
    -2:
      str := 'Even inputs, ';
    -3:
      str := 'Tri inputs, ';
    otherwise
      if incnt = 1 then
        str := '1 input, '
      else
        str := stringof(incnt : 1, ' inputs, ');
  end;
  case outcnt of
    -1:
      str := concat(str, 'same num outputs. ');
    -2:
      str := concat(str, 'outputs 1/2 of in.');
    -3:
      str := concat(str, 'outputs 1/3 of in.');
    otherwise
      if outcnt = 1 then
        str := concat(str, '1 output.')
      else
        str := stringof(str, outcnt : 1, ' outputs.');
  end;
  InOutCountStr := str;
```

```
end;

procedure LGetString (var str: str255; c: Cell; list: ListHandle);
  var
    datalen: integer;
    dataptr: Ptr;
begin
  dataPtr := Ptr(ord4(@str) + 1);
  dataLen := 255;
  LGetCell(dataPtr, dataLen, c, list);
  str[0] := chr(dataLen);
end;

function SetDMOutput (var dm: DMRec): boolean;
  { Put up a dialog box to allow the user to edit the outputs for the selected DM's. }
  const
    SetOutID = 2103;      { Dialog ID number }

    btnStart = 16;
    colNum = 6;
  var
    dlogPtr: DialogPtr;
    i, itemHit, kind, first: integer;
    row, col, btnEnd: Integer;
    d: DType;
    h: Handle;
    r: Rect;
    tempDM: DMRec;
begin
  tempDM := dm;
  with tempDM do
    begin
      ParamText(Name, '', '', '');
      dlogPtr := GetNewDialog(SetOutID, nil, Pointer(-1));
      PositionWindow(dlogPtr, 50, 10);
      for i := 0 to maxDMOutput do
        begin
          first := btnStart + i * colNum;
          for d := intD to DType(colNum - 1) do
            if i < outputs then
              begin
                if not (d in DMTypes[typeIdx].outTypes[i]) then
                  begin
                    HideDItem(dlogPtr, first + ord(d));
                  end;
              end
            else
              HideDItem(dlogPtr, first + ord(d));
          if i < outputs then
            RadioRange(dlogPtr, first, colNum, ord(PointsOut[i].outType));
        end;
      ShowWindow(dlogPtr);
      btnEnd := btnStart + outputs * colNum;
```

```
      repeat
        ModalDialog(nil, itemHit);
        if (itemHit >= btnStart) and (itemHit < btnEnd) then
          begin
            row := (itemHit - btnStart) div colNum;
            col := (itemHit - btnStart) mod colNum;
            PointsOut[row].outType := DType(col);
            RadioRange(dlogPtr, btnStart + row * colNum, colNum, ord(PointsOut[row].outType));
          end;
      until itemHit <= 2;  { Until OK or Cancel is clicked. }
      if itemHit = 1 then
        begin { OK clicked. }
          dm := TempDM;
          for i := dm.outputs to maxDMOutput do
            dm.PointsOut[i].outType := dm.PointsOut[dm.outputs - 1].outType;
          SetDMOutput := true;
        end
      else
        SetDMOutput := false;
      DisposDialog(dlogPtr);
    end;
  end;

{ This function is a modal dialog box filter for EditDMmodule.  It hit tests}
{ for happenings in the popup menu and the various list managed scroll}
{ bars, events that Modal Dialog does not catch. }

  function EdDMmFilter (dlg: DialogPtr; var evt: EventRecord; var itemHit: integer): boolean;
    var
      pt, c: Point;
      oldPort: grafPtr;
      bool: boolean;
      i, itemNo, top: integer;
  begin
    GetPort(oldPort);
    SetPort(dlg);
    EdDMmFilter := false;
    pt := evt.where;
    GlobaltoLocal(pt);
    case evt.what of

      mouseDown:

        if PtInRect(pt, itemBox) then
          itemHit := popUpItemNo
        else if PtInRect(pt, DMListInfo[DMioListItem].box) then
          begin
            if LClick(pt, evt.modifiers, DMListInfo[DMioListItem].lH) then
              itemHit := 520 { double click occured }
            else
              itemHit := DMioListItem;
            EdDMmFilter := true;
          end
```

```
else
  for itemNo := DMkindItem to DMoutSixItem do
    with DMListInfo[itemNo] do
      if PtInRect(pt, box) then
        begin
          itemHit := itemNo;
          bool := LClick(pt, evt.modifiers, IH);
          SetPt(c, 0, 0);
          if not LGetSelect(true, c, DMListInfo[itemNo].IH) then
            c.v := 0;
          newSelect := c.v;
          if itemHit = DMkindItem then    { If the user clicked in the scrollbar }
            if pt.h > box.right - 15 then     { of the DMType list then }
              itemHit := 10000;           { don't send any itemhit. }
          if itemNo in inputLists then
            begin
              itemHit := 501;
              if bool then
                itemHit := 511;
              if itemNo = DMinSixItem then
                begin
                  top := IH^^.visible.top;
                  LScroll(0, top - DMListInfo[DMinNameItem].IH^^.visible.top,
DMListInfo[DMinNameItem].IH);
                  LScroll(0, top - DMListInfo[DMinRTItem].IH^^.visible.top,
DMListInfo[DMinRTItem].IH);
                end;
            end
          else if itemNo in outputLists then
            begin
              itemHit := 502;
              if bool then
                itemHit := 512;
              if itemNo = DMoutSixItem then
                begin
                  top := IH^^.visible.top;
                  LScroll(0, top - DMListInfo[DMoutNameItem].IH^^.visible.top,
DMListInfo[DMoutNameItem].IH);
                end;
            end;
          if BitAnd(evt.modifiers, optionKey) <> 0 then
            itemHit := itemHit + 10;
          EdDMmFilter := true;
        end;

keyDown:
  begin
    if BitAnd(evt.message, $FF) = 13 then
      begin
        EdDMmFilter := true;     { turn carridge return into OK. }
        itemHit := 1;
      end
    else
```

```
        autoName := false;
      end;
    otherwise
      ;
  end;
  SetPort(oldPort);
end;


procedure EdDMmusrDraw (theWindow: WindowPtr; itemNo: integer);
  { Procedure that updates the list manager lists. }
  var
    r: rect;
begin
  r := DMListInfo[itemNo].box;
  insetRect(r, -1, -1);
  FrameRect(r);
  LUpdate(theWindow^.visRgn, DMListInfo[itemNo].lH);
end;

procedure DMHelpDraw (theWindow: WindowPtr; itemNo: integer);
  { Procedure that updates the help display. }
  const
    emptystr = ' ';
  var
    r: rect;
    strp: StringPtr;
    oldFont, oldSize: integer;
    h: Handle;
    oldPort: GrafPtr;
begin
  GetPort(oldPort);
  SetPort(theWindow);
  FrameRect(HelpRect);
  r := HelpRect;
  insetRect(r, 2, 2);

  h := GetNamedResource('STR ', DMtypename);
  if h <> nil then
    begin
      strp := StringHandle(h)^;
      oldfont := thePort^.txFont;
      oldsize := thePort^.txSize;
      TextFont(geneva);
      TextSize(9);
      TextBox(Ptr(ord4(strp) + 1), length(strp^), r, teJustLeft);
      ReleaseResource(h);
      TextFont(oldFont);
      TextSize(oldSize);
    end
  else
    EraseRect(r);
  SetPort(oldPort);
```

```
  end;

{ This is the actual function that creates the dialog box and manages the}
{ various changes that users may make to a Data Massage module. }

  function EditDMmodule; {  (var dm : DMRec) : boolean }
    var
      i, j, itemHit: integer;
      t: DMType;
      ItemH: Handle;
      db, box: Rect;
      c: Point;
      flag, usrChangedState, showState, showDisp: boolean;
      str: nameStr;
      rt: InputKind;
      s: SixAxisType;
      text: str255;
      origDM: DMRec;
    { from EdIOList parameters }
      NewName: nameStr;
      NewSix: SixAxisType;
      isInput: boolean;           { True if showing I/O list for input types. }
      crntSelected: integer;      { index of current I/O slot selection. }
      oldPort, oldPort2: GrafPtr;
      LastSixTick: longInt;     { Variables to keep track of double-click on the sixAxis buttons. }
      LastSix: SixAxisType;
      realInputs, origInputs: integer;
      realOutputs: integer;

    { This function determines the correct level of the pop-up hierarchy for}
    { a pre-existing DM.  For example, if a DM is a SINE function, then the }
    { correct pop-up level is "Trigonometric."}

    function calcRightHier (whichDM: integer): integer;
      var
        count, runSum, good: integer;
    begin
      runSum := 0;
      good := 0;
      for count := 1 to currentDMgroups do
        begin
          if ((whichDM >= runSum) and (whichDM <= (runSum - 1 + DMOffsetList[count]))) then
            if (good = 0) then
              begin
                calcRightHier := count;
                good := 1;
              end
            else
          else
            runSum := runSum + DMOffsetList[count];
        end;
    end;
```

```
{ findStartStop calculates the correct range of DM types to display}
{ in the scrolling list. Group is the pop-up number (1 through 7) and}
{ start and stop are integers in this range.}

procedure findStartStop (group: integer; var sta, sto: integer);
 var
  offset: integer;
begin
 start := 0;
 stop := 0;
 for offSet := 1 to (group - 1) do
  start := start + DMOffsetList[offset];
 stop := start + DMOffsetList[group] - 1;
end;

{ SetListRow clears a given list and allocates NewRow elements.}

procedure SetListRow (NewRow: integer; lH: ListHandle);
 var
  i: integer;
begin
 LDelRow(0, 0, lH);
 i := LAddRow(NewRow, 0, lH);
end;


{ Fill the lists, set buttons, display name, set up all the things in the active dialog }
{ box so it will be displayed and handled properly by modaldialog. }

procedure FillDMCells;
 var
  c: cell;
  i, j: integer;
  str: string;
  h: Handle;
begin
 DMtypename := DMTypes[dm.typeIdx].Name;          { Set the typename for the help update routine. }
 DMHelpDraw(dlogPtr, DescTextItem);
 if autoName then
  begin { if automatically generating DM names make one for this type. }
   SetEdText(dlogPtr, NameEdItem, UniqueDMName(concat(DMtypename, 'DM')));
   SelIText(dlogPtr, NameItem, 0, 32000);
  end;
 RadioOn(dlogPtr, DMonItem, showState);
 RadioOn(dlogPtr, displayItem, showDisp);
 RadioOn(dlogPtr, DMLinesItem, not dm.noLines);
 case realInputs of
  -1:
   str := 'Any inputs, ';
  -2:
   str := 'Even inputs, ';
  -3:
   str := 'Tri inputs, ';
```

```
    otherwise
      if dm.inputs = 1 then
        str := '1 input, '
      else
        str := stringof(dm.inputs : 1, ' inputs, ');
  end;
  case realOutputs of
    -1:
      str := concat(str, 'same num outputs. ');
    -2:
      str := concat(str, 'outputs 1/2 of in.');
    -3:
      str := concat(str, 'outputs 1/3 of in.');
    otherwise
      if dm.outputs = 1 then
        str := concat(str, '1 output.')
      else
        str := stringof(str, dm.outputs : 1, ' outputs.');
  end;
  SetDlgText(dlogPtr, statText, IOnumTextItem, str);
  for i := DMinRTItem to DMinSixItem do
    SetListRow(dm.inputs, DMListInfo[i].lH);
  SetPt(c, 0, 0);
  for i := 0 to dm.inputs - 1 do
    begin
      c.v := i;
      with dm.SlotsIn[i] do
        begin
          if name = '' then
            str := ''
          else
            case kind of
              frmRaw:
                str := 'Raw';
              frmTree:
                str := 'Tree';
              frmDM:
                str := 'DM';
            end;
          LSetCell(pointer(ord4(@str) + 1), length(str), c, DMListInfo[DMinRTItem].lH);
          LSetCell(pointer(ord4(@name) + 1), length(name), c, DMListInfo[DMinNameItem].lH);
          if (kind = frmRaw) or (name = '') then
            str := ''
          else if kind = frmTree then
            str := SixAxisName(SixAxisType(inIdx))
          else
            str := ntos(inIdx + 1);
          LSetCell(pointer(ord4(@str) + 1), length(str), c, DMListInfo[DMinSixItem].lH);
          if isInput then
            if c.v = crntSelected then
              for j := DMinRTItem to DMinSixItem do
                LSetSelect(true, c, DMListInfo[j].lH);
        end;
```

```
      end;
    for i := DMoutNameItem to DMoutSixItem do
      SetListRow(dm.outputs, DMListInfo[i].lH);
    for i := 0 to dm.outputs - 1 do
      begin
        c.v := i;
        with dm.PointsOut[i] do
          begin
            LSetCell(pointer(ord4(@name) + 1), length(name), c, DMListInfo[DMoutNameItem].lH);
            if name = '' then
              str := ''
            else
              str := SixAxisName(SixAxis);
            LSetCell(pointer(ord4(@str) + 1), length(str), c, DMListInfo[DMoutSixItem].lH);
            if not isInput then
              if c.v = crntSelected then
                for j := DMoutNameItem to DMoutSixItem do
                  LSetSelect(true, c, DMListInfo[j].lH);
          end;
      end;
    SetPt(c, 0, crntSelected);
    if isInput then     { if current selection is input then show it. }
      for i := DMinRTItem to DMinSixItem do
        LAutoScroll(DMListInfo[i].lH)
    else
      for i := DMoutNameItem to DMoutSixItem do
        LAutoScroll(DMListInfo[i].lH);

  end;


  { MakeKindList goes through many contortions to correctly set up}
  { and display the current list of DM types.  The displayed list is }
  { filtered to those that are in the current pop-up item, as determined }
  { by the procedure findStartStop, above}

  procedure MakeKindList;
    var
      i: integer;
      c: point;
  begin
    c.h := 0;
    findStartStop(lastPopUp, start, stop);
    with DMListInfo[DMKindItem] do
      begin
        LDoDraw(false, lH);
        EraseRect(lH^^.rView);
        SetListRow(stop - start + 1, lH);
        c.v := 0;
        for i := start to stop do  {topDMType}
          begin
            with DMTypes[i] do
              begin
```

```
        LSetCell(pointer(ord4(@name) + 1), length(name), c, lH);
        if dm.typeIdx = i then
          LSetSelect(true, c, lH);
      end;              { with }
    c.v := c.v + 1;
   end;                 { for i }
  LDoDraw(true, lH);
  LUpdate(dlogPtr^.visRgn, DMListInfo[DMKindItem].lH);
  LAutoScroll(lH);
 end;                   { with }
end;                    { MakeKindList }


{ A procedure that simply changes the static text item}
{ to reflect the currently chosen pop-up. This is}
{ called when the dlog is first created and whenever the pop-up}
{ item is changed}

procedure setMenuName (whichItem: integer);
 var
  statText: handle;
  statType: integer;
  statBox: rect;
  aString: str255;

begin
 GetDItem(dlogPtr, groupNameItem, statType, statText, statBox);

 if whichItem > 0 then
  GetItem(PopUpMenu, whichItem, aString)
 else
  announce(stringof('Menu Error'));
 SetIText(statText, aString);
end;


{ popUpDMTypes brings up a popUp menu whenever the user}
{ clicks on the correct box. It returns the menu item, which}
{ corresponds to the item. }

function popUpDMTypes (topLeft: point; lastOne: integer): integer;
 var
  menuResult: longInt;
  validPop: integer;
begin
 if lastPopUp = 0 then
  lastPopUp := 1;
 LocalToGlobal(topLeft);
 menuResult := PopUpMenuSelect(PopUpMenu, topLeft.v + 3, topLeft.h + 3, lastOne);
 if LoWord(menuResult) = 0 then
  validPop := lastPopUp
 else
  validPop := LoWord(menuResult);
```

```
    setMenuName(validPop);
    popUpDMTypes := validPop;
  end;


  { This procedure adds items to the scroll list}
  { where input and output items are selected.}
  { Changed to do an insertion sort to alphabetize the names.  CLB - 8/9/89 }

  procedure addAnotherName (n: nameStr; alphabetize: boolean);
    var
      c: point;
      i: integer;
    function alphaAddAt: integer;
      { Look for where alphabetically to add the given name. }
      { Do a binary search comparing against names already in the list. }
      const
        stringSize = 80;
      var
        i, dataLen, min, max: integer;
        cmpStr: string[stringSize];
        p: Ptr;
        c2: Cell;
    begin
      with DMListInfo[DMioListItem] do
        begin
          p := Ptr(ord4(@cmpStr) + 1);
          c2.h := 0;
          c2.v := lH^^.dataBounds.bottom;
          min := 0;
          max := lH^^.dataBounds.bottom;
          while max - min > 0 do
            begin           { while range to search on is more than 1. }
              c2.v := min + (max - min) div 2;
              dataLen := stringSize;
              LGetCell(p, dataLen, c2, lH);
              cmpStr[0] := chr(dataLen);
              i := RelString(n, cmpStr, false, true);
              case i of
                0: { equal, add here }
                  max := min;
                -1:      { n < cmpStr, search below. }
                  max := c2.v;
                1:    { n > cmpStr, search above. }
                  begin
                    c2.v := c2.v + 1;
                    min := c2.v;
                  end;
              end;  { case }
            end;    { while }
          alphaAddAt := c2.v;
        end;         { with }
    end;
```

```
begin
  c.h := 0;
  with DMListInfo[DMioListItem] do
    begin
      if alphabetize then
        c.v := alphaAddAt
      else
        c.v := lH^^.dataBounds.bottom;
      i := LAddRow(1, c.v, lH);
      LSetCell(pointer(ord4(@n) + 1), length(n), c, lH);
      if NewName = n then
        LSetSelect(true, c, lH);
    end;
end;


function CheckDM: boolean;
{ Return true if the dm has it's inputs and outputs hooked up, has a name and is }
{ ready to be initialized. }
  var
    ok: boolean;
    text: str255;
    i: integer;
    c: Cell;
begin
  ok := false;
  GetEdText(dlogPtr, NameEdItem, text);
  dm.name := text;
  if dm.name <> '' then                    { If it has a name then }
    begin
      ok := true;
    end;
  if not ok then
    sysbeep(3);
  CheckDM := ok;    { Looks like everything was OK. }
end;


procedure SetSixBtns;
  var
    i, j, max, hiliteState, value: integer;
    ItemH: Handle;
    cH: ControlHandle;
    box: Rect;
    c: Point;
    str: str255;
begin
  case rt of
    frmRaw:
      max := -1;
    frmTree:
      max := 500;
```

```
      frmDM:
        begin
              { Since DM's are sorted by name, to find out how many outputs a DM has you have to }
              { get the name from the list and use it to find the dm. }
          SetPt(c, 0, 0);
          if LGetSelect(true, c, DMListInfo[DMioListItem].lH) then
            begin
              LGetString(str, c, DMListInfo[DMioListItem].lH);
              i := FindDM(str, true);
              if i >= 0 then
                max := DMRecsPtr^[i].outputs - 1
              else
                max := -1;
              if ord(NewSix) > max then
                NewSix := SixAxisType(0);
            end
          else
            max := -1;
        end;
    end;    { case }
    for i := 0 to 5 do
      begin
        GetDItem(dlogPtr, DMioXItem + i, j, ItemH, box);
        cH := ControlHandle(itemH);
        if i > max then
          hiliteState := 255            { turn button off. }
        else
          hiliteState := 0;
        if (hiliteState <> 255) and (i = ord(NewSix)) then
          value := 1              { mark button }
        else
          value := 0;               { turn button on. }
        HiliteControl(cH, hiliteState);
        SetCtlValue(cH, value);
      end;
  end;

  procedure SetIOItems (newIOList: boolean);
      { Set the IO raw/tree/dm buttons and the six x,y,z etc or 1,2,3,4 dm buttons. }
      { If newIOList is true then generate a new I/O list. }
    var
      i, j, k: integer;
      ItemH: Handle;
      cH: ControlHandle;
      box: Rect;
      str: string;
      allNames: boolean;

    procedure AddEdioRow (p: PRecPtr);
      var
        n: nameStr;
    begin
      if allNames then
```

```
        n := PRecName(p)
      else
        n := p^.name;
      if n <> '' then
        AddAnotherName(n, true);
    end;

  begin
    if not isInput then
      rt := frmTree;
    RadioRange(dlogPtr, DMioRawItem, 3, ord(rt));
    SetSixBtns;
    for i := 0 to 5 do     { Set the names of the buttons. }
      begin
        GetDItem(dlogPtr, DMioXItem + i, j, ItemH, box);
        cH := ControlHandle(itemH);
        if rt = frmDM then
          str := ntos(i + 1)
        else
          str := SixAxisName(SixAxisType(i));
        SetCTitle(cH, str);
      end;
    for i := DMioRawItem to DMioDMItem do
      EnDisDItem(dlogPtr, i, isInput);
    if newIOList then
      begin
        LDelRow(0, 0, DMListInfo[DMioListItem].IH);
        LDoDraw(false, DMListInfo[DMioListItem].IH);
        case rt of
          frmRaw:
            for i := 0 to RawDesc.numUsed do
              addAnotherName(rawDataDef[i].name, false);
          frmDM:
            begin
              SetCursor(ClockCurs^^);
              for i := 0 to numOfDMrec do
                addAnotherName(DMRecsPtr^[i].name, true);
              InitCursor;
            end;
          frmTree:
            begin
              SetCursor(ClockCurs^^);
              allNames := optionIsDown;
              PreFixTreeWalk(mainTreePtr^.TreeRoot, AddEdioRow);
              InitCursor;
            end;
        end;        { case }
        LDoDraw(true, DMListInfo[DMioListItem].IH);
        LAutoScroll(DMListInfo[DMioListItem].IH);
        LUpdate(dlogPtr^.visRgn, DMListInfo[DMioListItem].IH);
      end;
  end;
```

```
procedure SetSelectedIO;
 type
  pctype = packed array[1..5] of char;
 var
  pcptr: ^pctype;
  NewName: nameStr;
  c: cell;
begin
 SetPt(c, 0, 0);
 with DMListInfo[DMioListItem] do
  if LGetSelect(true, c, lH) then
   begin  { a name is selected. }
    i := sizeof(nameStr) - 1;
    LGetCell(pointer(ord4(@NewName) + 1), i, c, lH);
    pcptr := @NewName;
    pcptr^[1] := chr(i);
    if isInput then
     with dm.SlotsIn[crntSelected] do
      begin
       name := NewName;
       inIdx := ord(NewSix);
       kind := rt;
      end
    else
     with dm.PointsOut[crntSelected] do
      begin
       name := NewName;
       SixAxis := NewSix;
      end;
   end;
end;

procedure FillAndInc;
{ Fill the currently selected Input or Output cell with the currently selected I/O name, kind, etc. }
{ Update the lists and display and inc to the next slot. }
 var
  newList: boolean;
begin
 newList := false;
 SetSelectedIO;
 crntSelected := crntSelected + 1;
 if (isInput and (crntSelected >= dm.inputs)) or (not isInput and (crntSelected >= dm.outputs)) then
  begin { went past the number of slots in the input or output list. }
   isInput := not isInput;     { switch lists, }
   crntSelected := 0;          { and start at the top. }
   if not isInput then
    if rt <> frmTree then
     newList := true;
  end;
 SetIOItems(newList);
 FillDMCells;
end;
```

```
   procedure IOListClicked (itemHit: integer);
{ User clicked on the list of inputs or the list of outputs.  501 = single click on inputs, }
{ 502 = output single click, 511 = input double click, 512 = output double click. }
     var
       flag: boolean;
       j: integer;
       newList: boolean;
   begin
     flag := false;
     if isInput <> odd(itemHit) then   { odd(501) or odd(511) is true. }
       begin { switching from input to output list or visi-versa. }
         isInput := odd(itemHit);
         newList := false;
         if not isInput then
           if rt <> frmTree then
             newList := true;
         SetIOItems(newList);
         flag := true;
         crntSelected := newSelect;
       end;
     if itemHit > 510 then
       begin    { double click on the input or output list. }
         crntSelected := newSelect;
         if isInput then
           dm.slotsIn[crntSelected].name := ''
         else
           dm.pointsOut[crntSelected].name := '';
         flag := true;
       end;
     if flag then        { remake both the lists. }
       FillDMCells
     else
       begin             { just deselect/select proper items. }
         c.h := 0;
         for j := DMkindItem to DMoutSixItem do
           if (isInput and (j in inputLists)) or (not isInput and (j in outputLists)) then
             begin
               c.v := crntSelected;
               LSetSelect(false, c, DMListInfo[j].lH);
               c.v := newSelect;
               LSetSelect(true, c, DMListInfo[j].lH);
             end;
         crntSelected := newSelect;
       end;
   end;


{ This is the  body of the EditDMmodule }

 begin
   LastSixTick := 0;
   GetPort(oldPort);
   origDM := dm;
```

```
inputLists := [DMinRTItem, DMinNameItem, DMinSixItem];
outputLists := [DMoutNameItem, DMoutSixItem];
showState := (origDM.state = on);
showDisp := origDM.dispLast;
usrChangedState := false;
NewSix := XAxis;
isInput := true;
rt := frmRaw;
crntSelected := 0;
origInputs := dm.Inputs;
realInputs := dm.Inputs;
realOutputs := dm.Outputs;
autoName := dm.name = '';
if dm.Inputs < 0 then
  dm.Inputs := maxDMInput + 1;
if dm.outputs < 0 then
  dm.outputs := maxDMOutput + 1;
dlogPtr := GetNewDialog(DMmodID, nil, Pointer(-1));
PositionWindow(dlogPtr, 50, 50);
ShowWindow(dlogPtr);
SetPort(dlogPtr);

for i := 1 to currentDMgroups do
  if DMOffsetList[i] = 0 then
    DisableItem(PopUpMenu, i);
GetDItem(dlogPtr, 25, itemType, popUpItem, itemBox);

SetEdText(dlogPtr, NameEdItem, dm.name);
for i := DMkindItem to DMioListItem do
  begin  { set up all the list managers used in this dialog (6 of them) }
    GetDItem(dlogPtr, i, j, ItemH, box);
    SetDItem(dlogPtr, i, userItem, @EdDMmusrDraw, box);
    DMListInfo[i].box := box;
    flag := (i in [DMinSixItem, DMoutSixItem, DMkindItem, DMioListItem]);
    if flag then
      box.right := box.right - 15;
    SetRect(db, 0, 0, 1, 0);
    SetPt(c, 0, 0);
    DMListInfo[i].lH := LNew(box, db, c, 0, dlogPtr, true, false, false, flag);
    DMListInfo[i].lH^^.selFlags := lOnlyOne;
  end;
  { Set the help rect item so it will be automatically drawn. }
GetDItem(dlogPtr, DescTextItem, j, ItemH, HelpRect);
SetDItem(dlogPtr, DescTextItem, userItem, @DMHelpDraw, HelpRect);
SetIOItems(true);

if (dm.typeIdx > 0) then
  lastPopUp := calcRightHier(dm.typeIdx)
else
  lastPopUp := 1;
findStartStop(lastPopUp, start, stop);
setMenuName(lastPopUp);
MakeKindList;
```

```
FillDMCells;      { fill the lists etc with current information. }

repeat
  ModalDialog(@EdDMmFilter, itemHit);
  case itemHit of

    popUpItemNo:
      begin
        GetPort(oldPort2);
        SetPort(dlogPtr);
        lastPopUp := popUpDMTypes(itemBox.topLeft, lastPopUp);
        MakeKindList;
        SetPort(oldPort2);
      end;

    1: { OK clicked, this module ok? }
      if not CheckDM then
        itemHit := 1000;
    DMonItem:
      begin
        usrChangedState := true;
        showState := not showState;
        radioOn(dlogPtr, DMonItem, showState);
      end;
    displayItem:
      begin
        showDisp := not showDisp;
        radioOn(dlogPtr, displayItem, showDisp);
      end;
    DMLinesItem:
      begin
        dm.noLines := not dm.noLines;
        radioOn(dlogPtr, DMLinesItem, not dm.noLines);
      end;
    DMkindItem:
      begin
        SetPt(c, 0, 0);
        if not LGetSelect(true, c, DMListInfo[DMkindItem].lH) then
          c.v := 0;
        dm.typeIdx := c.v + start;
        dm.inputs := DMTypes[c.v + start].inputs;
        realInputs := dm.inputs;
        if dm.inputs < 0 then
          dm.inputs := maxDMInput + 1;
        dm.outputs := DMTypes[c.v + start].outputs;
        realOutputs := dm.outputs;
        if dm.outputs < 0 then
          dm.outputs := maxDMOutput + 1;
            { for all outputs, if old output isn't permited in new dm type then set output to default. }
        for i := 0 to maxDMOutput do
          if not (dm.PointsOut[i].outType in DMTypes[c.v + start].outTypes[i]) then
            dm.PointsOut[i].outType := DMTypes[c.v + start].defaultOut[i];
```

```
        dm.massageProc := DMTypes[c.v + start].massageProc;
        FillDMCells;
      end;
    DMioXItem, DMioYItem, DMioZItem, DMioYawItem, DMioPitchItem, DMioRollItem:
      begin
        NewSix := SixAxisType(itemHit - DMioXItem);
        RadioRange(dlogPtr, DMioXItem, 6, ord(NewSix));
        if ((Ticks^ - LastSixTick) <= GetDblTime) and (NewSix = LastSix) then
          begin
            FillAndInc;
          end;
        LastSix := NewSix;
        LastSixTick := Ticks^;
      end;
    DMioRawItem, DMioTreeItem, DMioDMItem:
      begin      { User clicked on raw, tree or dm button. }
        rt := inputKind(itemHit - DMioRawItem);
        SetIOItems(true);
      end;
    DMioListItem:
      begin
        SetSixBtns;
      end;
    501, 511:        { click or double-click on an input list. }
      IOListClicked(itemHit);
    502, 512:        { click or double-click on an output list. }
      IOListClicked(itemHit);
    520:        { User double clicked on I/O list.  Put this is selected box. }
      FillAndInc;
    otherwise
      ;
  end;    { case }
until itemHit <= 2;
for j := DMkindItem to DMioListItem do
  LDispose(DMListInfo[j].IH);
DisposDialog(dlogPtr);
if itemHit = 1 then
  begin
    if usrChangedState then
      if showState then
        dm.state := on
      else
        dm.state := usrOff
    else if dm.state <> usrOff then
      dm.state := on;
    if realInputs < 0 then
      begin  { Variable number of inputs.  Figure out how many we ended up with. }
        dm.Inputs := 1;
        for i := 0 to maxDMInput do
          if dm.SlotsIn[i].name <> '' then
            dm.Inputs := i + 1;
        i := dm.Inputs mod (-realInputs);
        if i <> 0 then
```

```
          dm.Inputs := dm.Inputs + i;
        end;
      if realOutputs < 0 then                    { Variable length outputs, base them on inputs. }
        dm.Outputs := dm.Inputs div (-realOutputs);
      if (origDM.TypeIdx <> dm.TypeIdx) or (origInputs <> dm.Inputs) then
        begin
          doVerb(closeDM, origDM);      { closing original frees private storage. }
          if origDM.dispLast then
            SetDisplay(origDM, false);
          dm.private := nil;
          DelDMMenu(origDM);          { delete any menu items this DM might have. }
          doVerb(InitDM, dm);         { opening copy makes more private storage. }
          dm.dispLast := showDisp;
          if dm.dispLast then
            SetDisplay(dm, dm.dispLast);
        end
      else if showDisp <> dm.dispLast then
        begin
          dm.dispLast := showDisp;
          SetDisplay(dm, showDisp);
        end;
      dm.turnsOnOff := false;
      EditDMmodule := true;
    end
  else
    begin
      dm := origDM;
      EditDMmodule := false;
    end;
  AcquireRefresh;
  SetPort(oldPort);
end;    { EditDMmodule }

end.
```

```
{---------------------------------}
{       DataMassage File I/O stuff       }
{---------------------------------}

{   Rev - Fixed a bug that showed up if you attempted to load a massaged file }
{   in that had more information in it than was allocated for RecBuffH.  Now }
{   it looks at the filesize and tries to allocate at least that much space. }
{   CLB  2/2/88. }
{   Comment - If you playback massaged data only the delta changes affect the }
{   tree.  So if the initial tree configuration is different than the initial config when }
{   the massaged was recorded it will stay in the wrong config until the node/sixtype }
{   changes. }
{   Rev - Fixed the bug commented on above so the first recorded list has all the}
{   used nodes in it.  That way the tree gets moved to it's start position.  CLB 4/12/88 }
{   Rev 12/89 CLB - Changed RecordTree so you pass whether you want the recorded }
{   tree state to be made invalid.  That way HostCom can use the recorded tree for delta changes. }
{   Rev 12/89 CLB - Upped the DM file version number.  Scale/Offset DM's changed and no longer }
{   have private storage.  Loading a new dm file with the old code would cause dm.private to be nil }
{   and the code would have dereferenced it.  The version change just stops old BE's from using new files. }

unit DMFileIO;

interface
  uses
    PrintTraps, AutoLib, ChuckStuff, FastStuff, Globals, Tree3DGlob, MiscRoutines, formTree3D, {}
    Tree3D, DMTypes, DMGlobals, HandleDMs, FlexDraw, Flex, EdDMList;

  type
{ DMGlobRec describes the resource in every DM file that is the global information }
{ for the DM's.  The version is for the whole saved DM info.  The namesOf array is }
{ indexed by ord(DMType) over the whole range of DMType.  It has the names of the }
{ types.  That way, if the ordering of DM's changes between file saves, the names }
{ can be matched up and the kind of each DM can be fixed up. }
    DMGlobRec = record
        version: integer;
        TypeNames: array[0..maxDMTypes] of nameStr;
      end;
    DMGlobRecPtr = ^DMGlobRec;

    RecordedTreeAr = array[1..maxStorage] of record
        name: nameStr;
        idx: integer;
        lastSix: SixType;
      end;

  var
    { DM recording globals are here so this can load and save recorded DM info. }
    recPtr, playPtr: ptrsType; { pointers for recording and playing raw data. }
    recEndPtr, playEndPtr: ptrsType;
    recordedSize: longInt;  { number of bytes already recorded. }
    recBuffH: handle;     { handle to the record buffer. }
    recStart, playStart: longint;   { jiffy count when recording or playing started. }
    playMassOn, recMassOn: boolean;  { current record or play dm state. }
```

```
   HostSendSize: integer;      { # of bytes to send for a host record. }

   { added to support writing of Massaged Data to Swivel command files. }
   wrtMassOn: boolean;
   out: Text;
   SwivDyItem: integer;   { Write swivel dynamic menu item. }

{ RecNodeNum is the number of nodes in the tree that the recorded data has }
{ been saved for.  ChangeRecMass set it.  RecTreePtr^ is a description of the }
{ tree recorded information is for.  idx is the index into mainTreePtr^.storage for }
{ the real node named 'name'.  lastSix is the local values of the node on the last }
{ iteration. }
   RecNodeNum: integer;
   RecTreePtr: ^RecordedTreeAr;

  procedure MakeRecordTree (AddUnnamed, InvalidLast: boolean);


  function SwAngStr (angle: integer): string;
  function SwPosStr (position: integer): string;

  procedure WriteSwivelTree (var out: Text; name: string; justPosition: Boolean);
  procedure ChangePlayMass (newState: boolean);
  procedure ChangeRecMass (newState: boolean);
  procedure ChangeWrtMass (newState: boolean);

  procedure SaveMassaged (refNum: integer);
  procedure LoadMassaged (refNum: integer);


  function dmioOpenDMs (vref: integer; fname: string; merge: boolean): integer;
  function dmioSaveDMs (vref: integer; fname: string): integer;


implementation

{ A Massaged Data File has the following format: }
{ version:1 integer  -   1 }
{ nodeNum:1 integer -   Number of nodes or points in the tree described in this file. }
{ for 1 to nodeNum:         }
{   name                 - 21 character pascal string (22 bytes ) }
{   upIdx:1 integer      - index to node that is up the tree from here. }
{   downIdx:1 integer    - index to the first node down. }
{   rightIdx:1 integer   - index to the next node to the right. ]}
{   rbIdx:1 integer      - integer to a node that this node draws a rubber-band line to. }
{   pos:6 :1 integers    - local orientation:  x, y, z, yaw, pitch, roll. }
{   flags:1 byte         -  [7,6,5,4,3,2,1,0]  }
{       7 = true if draw a line down to this nodes desendant }
{       6 = true if draw a line to the node to the right of this one.  If there is no node }
{           to the right, draw a line to the first node in this list of siblings, closing }
{           the polygon. }
{       5-0 - Output bits }
```

```
const
  doBound = true;      { If true and points have bounds then when you write a swivel tree script the points
    become }
                        { bounding cubes that are the size of the original swivel bounding cubes. }

{ The rest of the file is comprised of a list of records which are changes to make to }
{ the local coordinates of nodes before calculating their global coordinates and }
{ rendering the tree. }
 type
  nodeDescType = record
    name: nameStr;
    upIdx, downIdx, rightIdx, rbIdx: integer;
    pos: SixType;
    flags: flagSet;
   end;

{ MDfileHeaderType is the header for a massage data file. }
  MDfileHeaderType = record
    version, nodeNum: integer;
   end;

{ Returns a string which is the right value for translating BodyElectric angles to Swivel script angles. }
 function SwAngStr; {(angle: integer): string }
 begin
  angle := degRange(angle);
  if angle > 1800 then
   SwAngStr := StringOf((angle - 3600) / 10 : 3 : 1, '  ')
  else
   SwAngStr := StringOf(angle / 10 : 3 : 1, '  ');
 end;

{ Returns a string which is the right value for translating BodyElectric position to Swivel script positions. }
 function SwPosStr; { position: integer): string }
 begin
  SwPosStr := StringOf(position / TreeConfig.SwivRatio : 3 : 3, '  ');
 end;

 procedure SetRecPlayMenu;
{ Set what the Record/Play menu should look like based on DA globals. }
 begin
  EnDisItem(DMMHndl, SaveMItem, (recBuffH <> nil));
  EnDisItem(DMMHndl, PlayMItem, (recBuffH <> nil));
  CheckItem(DMMHndl, RecMItem, RecMassOn);
  CheckItem(DMMHndl, PlayMItem, PlayMassOn);
 end;

 procedure AddtoRecTree (trp: TreeRecPtr; p: PRecPtr; InvalidLast: boolean);
{ Add this node to the recorded tree list. Index the count of objects in the }
{ recorded tree. The RecTreePtr^ is a list of all the nodes in the tree that massaged }
{ data was recorded for, with their names and a mapping into Storage for where }
{ the node actually is. }
{ Modified so the lastSix would start out at an invalid number. That way }
```

```
{ the first recorded massaged data will have the whole tree and it will move the }
{ tree to the proper start configuration.  CLB 4/12/88 }
    var
      i: integer;
  begin
    RecNodeNum := RecNodeNum + 1;
    with RecTreePtr^[RecNodeNum] do
      begin
        name := PRecName(p);
        idx := PtrtoL(trp, p);
        for i := 0 to 5 do                { make lastSix invalid so first record }
          if InvalidLast then
            lastSix.s[i] := -3333        { will record the entire tree. }
          else
            lastSix.s[i] := p^.lSix.s[i];
      end;
    if (p^.flags * [out0..out5]) <> [] then
      begin  { CLB 7/12/88 - count the number to send to the host. }
        HostSendSize := HostSendSize + 2;
        for i := 0 to 5 do
          if flagType(ord(out0) + i) in p^.flags then
            HostSendSize := HostSendSize + 2;
      end;
  end;

{ Make the tree that is used by doRecord and SendHostRecord. }
  procedure MakeRecordTree (AddUnnamed, InvalidLast: boolean);
    procedure AddNode (p: PRecPtr);
    begin
      if AddUnnamed or (p^.name <> '') then
        AddtoRecTree(mainTreePtr, p, InvalidLast);
    end;
  begin
    RecNodeNum := 0;
    HostSendSize := 0;
    PreFixTreeWalk(mainTreePtr^.TreeRoot, AddNode);
  end;

  procedure ChangeRecMass; { (newState : boolean) }
{ Change the state of recording massaged data to newState.  If it is already newState }
{ then don't do anything. }
    var
      l, blkSize: longint;
  begin
    if newState <> RecMassOn then
      begin
        if recBuffH = nil then
          begin
            blkSize := MaxBlock div 2;
            recBuffH := NewHandle(blkSize);
          end;
        if recBuffH = nil then
          begin
```

```
          Announce('Not enough memory for record buffer!');
          sysbeep(3);
        end
      else
        begin
          if newState then {Set Recording ON and do setup}
            begin
              MoveHHi(recBuffH);
              HLock(recBuffH);
              recPtr.bp := StripAddress(recBuffH^);
              recEndPtr.l := recPtr.l + GetHandleSize(RecBuffH);
              RecMassOn := true;
              PlayMassOn := false;
              MakeRecordTree(true, true);
              Announce('Recording Massaged on...');
              recStart := rawTick;
            end
          else {Stop Recording}
            begin
              recPtr.lp^ := $FFFFFF;
              recPtr.l := recPtr.l + 4;
              recordedSize := recPtr.l - ord4(StripAddress(recBuffH^));
              I := round(recordedSize / GetHandleSize(recBuffH) * 100);
              HUnlock(recBuffH);
              RecMassOn := false;
              Announce(StringOf('Recording Massaged off, %', I : 1, ' used...'));
            end;
        end;
      DMCodeInvalid := true;
    end;
  SetRecPlayMenu;
end;       { ChangeRecMass }

procedure ChangePlayMass; { (newState : boolean) }
{ Change the state of playing Mass data to newState.  If it is already newState }
{ then don't do anything. }
begin
  if newState <> PlayMassOn then
    begin
      if (recBuffH = nil) or (recordedSize = 0) then
        sysbeep(3)
      else if newState then
        begin  { turn playing on }
          if RecMassOn then
            ChangeRecMass(false);
          MoveHHi(recBuffH);
          HLock(recBuffH);
          playPtr.bp := StripAddress(recBuffH^);
          playEndPtr.l := playPtr.l + recordedSize;
          PlayMassOn := true;
          Announce('Massage playback on...');
          mainTreePtr^.dirty := true;
          playStart := rawTick;
```

```
        end
      else
        begin   { turn playing off. }
          HUnlock(recBuffH);
          PlayMassOn := false;
          Announce('Massage playback off...');
        end;
      DMCodeInvalid := true;
    end;
  SetRecPlayMenu;
end;        { ChangePlayMass }

procedure WriteSwivelTree (var out: Text; name: string; justPosition: Boolean);
{ Write the entire current tree out as swivel text commands to the file specified by the user. }
{ This is separate from writting anamation commands out. }
  const
    centRatio = 28.35;         { The pixel / centemeters swivel ratio. }
  var
    str, str2: Str255;
    secs: longInt;
  procedure CutCube;
  begin
    Writeln(out, 'BeginPathObject');
    Writeln(out, 'NewPath');
    Writeln(out, '-64  -64  CrossPoint');
    Writeln(out, '64  -64  CrossPoint');
    Writeln(out, '64  64  CrossPoint');
    Writeln(out, '-64  64  CrossPoint');
    Writeln(out, '-64  -64  CrossPoint');
    Writeln(out, 'NewPath');
    Writeln(out, '-5  0  LathePoint');
    Writeln(out, '-5  -5  LathePoint');
    Writeln(out, '5  5  LathePoint');
    Writeln(out, '5  0  LathePoint');
    Writeln(out, 'EndPathObject');
    Writeln(out, 'Cut');
  end;

  procedure WriteCube (cube: intCube);
    procedure WriteTwo (int1, int2: integer);
    begin
      Writeln(out, SwPosStr(int1), ' ', SwPosStr(int2), ' ,');
    end;
  begin
    with cube do
      begin
        if BOR(BOR(minPt.x, BOR(minPt.y, minPt.z)), BOR(maxPt.x, BOR(maxPt.y, maxPt.z))) = 0 then
          begin
            minPt.x := -5;
            minPt.y := -5;
            minPt.z := -5;
            maxPt.x := 5;
            maxPt.y := 5;
```

```
        maxPt.z := 5;
      end;
    if true then
      begin
        Writeln(out, 'BeginPathObject');
        Writeln(out, 'CrossPoints:');
        WriteTwo(minpt.x, minpt.y);
        WriteTwo(maxpt.x, minpt.y);
        WriteTwo(maxpt.x, maxpt.y);
        WriteTwo(minpt.x, maxpt.y);
        WriteTwo(minpt.x, minpt.y);
        Writeln(out, 'LathePoints:');
        WriteTwo(minpt.z, 0);
        WriteTwo(minpt.z, 64);
        WriteTwo(maxpt.z, 64);
        WriteTwo(maxpt.z, 0);
        Writeln(out, 'EndPathObject');
      end
    else
      begin
        Writeln(out, 'BeginPathObject');
        Writeln(out, 'CrossPoints:');
        WriteTwo(-64, -64);
        WriteTwo(64, -64);
        WriteTwo(64, 64);
        WriteTwo(-64, 64);
        WriteTwo(-64, -64);
        Writeln(out, 'LathePoints:');
        WriteTwo(minpt.z, 0);
        WriteTwo(minpt.z, maxpt.y);
        WriteTwo(maxpt.z, maxpt.y);
        WriteTwo(maxpt.z, 0);
        Writeln(out, 'TopPoints:');
        WriteTwo(minpt.z, 0);
        WriteTwo(minpt.z, maxpt.x);
        WriteTwo(maxpt.z, maxpt.x);
        WriteTwo(maxpt.z, 0);
        Writeln(out, 'FrontTopPoints:');
        WriteTwo(minpt.z, 0);
        WriteTwo(minpt.z, minpt.x);
        WriteTwo(maxpt.z, minpt.x);
        WriteTwo(maxpt.z, 0);
        Writeln(out, 'DownSidePoints:');
        WriteTwo(minpt.z, 0);
        WriteTwo(minpt.z, minpt.y);
        WriteTwo(maxpt.z, minpt.y);
        WriteTwo(maxpt.z, 0);
        Writeln(out, 'EndPathObject');
      end;
  end;
end;

procedure WriteOut (p: PRecPtr);
```

```
  { write the swivel text that makes a little square for this point. }
 var
  i: integer;
 procedure CheckConstraint (p: PRecPtr; axis: integer);
  { !!! Note that the constraint ranges sent to swivel are in the form '<max> <min> ,' not '<min> <max>
  ,' like the }
  { swivel command documentation says.  It's a problem with swivel.  I'm just sending what works. CB
  1/13/90 }
 begin
  with p^ do
   if mins.s[axis] = maxs.s[axis] then
    Writeln(out, 'Lock', SixAxisName(SixAxisType(axis)))
   else if axis < 2 then
    begin
     if (mins.s[axis] > -20000) or (maxs.s[axis] < 20000) then
      begin
       WriteLn(out, SixAxisName(SixAxisType(axis)), 'Range: ', SwPosStr(maxs.s[axis]), ' ',
SwPosStr(mins.s[axis]), ' ,');
      end;
    end
   else if axis = 2 then
    begin    { Z axis has to be sign flipped. }
     if (mins.s[axis] > -20000) or (maxs.s[axis] < 20000) then
      begin
       WriteLn(out, SixAxisName(SixAxisType(axis)), 'Range: ', SwPosStr(-mins.s[axis]), ' ',
SwPosStr(-maxs.s[axis]), ' ,');
      end;
    end
   else
    begin { 3-5 are angles }
     if (mins.s[axis] <> 0) or (maxs.s[axis] <> 3599) then
      begin
       WriteLn(out, SixAxisName(SixAxisType(axis)), 'Range: ', SwAngStr(maxs.s[axis]), ' ',
SwAngStr(mins.s[axis]), ' ,');
      end;
    end;
 end;
begin
 with p^ do
  begin
   if justPosition then
    Writeln(out, 'FindObject ', PRecName(p))
   else
    begin
     if doBound then
      WriteCube(p^.bound)
     else
      begin
       Writeln(out, 'FindObject World');
       Writeln(out, 'Paste');
      end;
     Writeln(out, 'MakeName ', PRecName(p));
    end;
```

```
        Writeln(out, 'LinkTo ', PRecName(up));
        writeln(out, 'RelPos: ', SwPosStr(ISix.pt.x), ' ', SwPosStr(ISix.pt.y), ' ', SwPosStr(-ISix.pt.z), '
       ,');
        writeln(out, 'RelAtt: ', SwAngStr(ISix.tt.roll), ' ', SwAngStr(ISix.tt.pitch), ' ',
       SwAngStr(ISix.tt.yaw), ' ,');
        for i := 0 to 5 do
          CheckConstraint(p, i);
      end;
    end;
  begin
    Announce('Writing Swivel Tree.');
    GetDateTime(secs);
    IUDateString(secs, abbrevDate, str);
    writeln(out, '( ', name, ' - ', str, ' )');
    if justPosition then
      writeln(out, '( Just position information. )')
    else
      begin
        Writeln(out, '( NewWorld )');
        Writeln(out, '( MakeName ', mainTreePtr^.treeRoot^.name, ' )');
      end;
    with TreeConfig do
      if SwivRatio = 72 then
        str := 'Inches'
      else if abs(SwivRatio - centRatio) < 0.001 then
        str := 'Centi'
      else
        str := 'Pixels';
    Writeln(out, '( Use', str, ' )');
    if not doBound then
      CutCube;
    PreFixTreeWalk(mainTreePtr^.treeRoot^.down, WriteOut);
    Writeln(out, 'DrawWorld');
  end;

{ Open a text file and write the commands nessesary to drive Swivel }
{ from the recorded data. }
  procedure ChangeWrtMass; { (newState : boolean) }
    var
      name, str: str255;
      vRef, oldRefNum, err: integer;
      secs: longInt;
  begin
    if newState <> wrtMassOn then
      begin
        if wrtMassOn then
          begin
            Close(out);
            wrtMassOn := false;
            Announce('Swivel file closed.');
          end
        else
          begin
```

```
        if not playMassOn then
          ChangePlayMass(true);
        if not playMassOn then
          begin
            Announce('Must record massaged data before writing a swivel script.');
          end
        else
          begin
            NewFileIdent(name, vRef, ExFileName(CrntfName[treeFile], 'Script'), 'Text file to save
      Swivel script as?');
            if name <> '' then
              begin
                err := GetVol(nil, oldRefNum);
                err := SetVol(nil, vRef);
                ReWrite(out, name);
                err := SetVol(nil, oldRefNum);
                wrtMassOn := true;
                Announce('Writing to swivel file.');
                GetDateTime(secs);
                IUDateString(secs, abbrevDate, str);
                writeln(out, '( ', str, ' )');
              end;    { got filename from the user. }
          end;
      end;            { turning wrtMassOn on. }
    end;
{ CheckItem(DMMHndl, DyItemtoItem(DMMHndl, SwivDyItem), wrtMassOn); }
  end;      { ChangeWrtMass }

  procedure SaveMassaged; { (refNum : integer) }
{ Save all the information needed about the current saved massaged data }
{ out to a file.  Prompt the user for a filename, and save it as a massaged }
{ file type.  }
{   CLB 7/12/88 - If refNum is <> 0 then assume it is the file ref num to write }
{   to and don't prompt the user.  Also, don't start recording, just write the tree.}
{   This is here so HostCom can have the routine write the tree out the serial port. }

    var
      Fname: str255;
      i, err, vRefNum: integer;
      count: longInt;
      fileHeader: MDfileHeaderType;
      gotrefNum: boolean;

    function writeOutNodes: integer;
    { Write a description of all the nodes in the current tree out to the open file }
    { specified by refNum.  }
      var
        i, err: integer;
        t, count: longInt;
        n: nodeDescType;
        { nodeMap describes the mapping of storage -> RecordedTree }
        nodeMap: array[1..maxStorage] of integer;
        spaces: nameStr;
```

```
function NodeIdx (p: PRecPtr): integer;
begin
  if p = nil then
    NodeIdx := 0
  else
    NodeIdx := nodeMap[PtrtoL(mainTreePtr, p)];
end;
begin { writeoutNodes }
 err := noErr;
 spaces := '';
 for i := 1 to nameSize do
  spaces := concat(spaces, ' ');
 err := 0;
 for i := 1 to maxStorage do     { Initialize all nodeMap to unused. }
  nodeMap[i] := -1;
 for i := 1 to RecNodeNum do               { for each node in RecordedTree }
  nodeMap[RecTreePtr^[i].idx] := i;       { figure out its map to storage. }
 if gotrefNum then
  announce(stringof('sending out ', RecNodeNum : 1, ' nodes, size = ', sizeof(nodeDescType) *
   RecNodeNum : 1, '.'));
 for i := 1 to RecNodeNum do
  if err = noErr then
   with mainTreePtr^.storage[RecTreePtr^[i].idx]^ do
    begin
     n.name := spaces;
     n.name := name;
     n.upIdx := NodeIdx(up);
     n.downIdx := NodeIdx(down);
     n.rightIdx := NodeIdx(right);
     n.rbIdx := NodeIdx(rBandptr);
     n.pos := lSix;
     n.flags := flags - [Dline, Rline];
     if lDown then
      n.flags := [Dline];
     if lRight then
      n.flags := n.flags + [Rline];
     count := sizeof(n);
     err := FSWrite(refNum, count, @n);
        { Delay a bit for the host communications. }
     t := TickCount;
     while TickCount < t + 1 do
      ;
    end;
  if err <> noErr then
   Announce(stringof('writeOutNodes: err = ', err : 1));
  writeOutNodes := err;
 end;

begin     { SaveMassaged }
 gotrefNum := (refNum <> 0);
 if ((recBuffH = nil) or (recordedSize = 0)) and (refNum = 0) then
  begin
```

```
      Announce('Can''t save, no recorded data.');
      sysbeep(3)        { no recorded data. }
    end
  else
    begin
      if refNum = 0 then
        begin
          NewFileIdent(FName, vRefNum, ExFileName(CrntfName[treeFile], 'massaged'), 'Save Massaged
      data as?');
          if FName <> '' then
            begin
              ChangeRecMass(false);
              ChangePlayMass(false);
              err := FSOpen(FName, vRefNum, refNum);
              if err = fnfErr then
                begin
                  err := Create(FName, vRefNum, AppType, MDfileType);
                  if err = noErr then
                    err := FSOpen(FName, vRefNum, refNum);
                end;
            end;    { user specified a name. }
        end
      else
        err := noErr;
      if err = noErr then
        begin
          err := SetEOF(refNum, 0);
          with fileHeader do
            begin
              version := MDversion;       { write this files version number }
              nodeNum := RecNodeNum;      { and the number of nodes. }
            end;
          count := sizeOf(fileHeader);
          err := FSWrite(refNum, count, @fileHeader);     { write header out. }
          if err = noErr then
            err := WriteOutNodes;         { write out the node descriptions. }
          if (err = noErr) and not gotrefNum then
            begin
              HLock(recBuffH);            { and last, just copy the recorded data }
              count := RecordedSize;      { out to the file. }
              err := FSWrite(refNum, count, recBuffH^);
              HUnlock(recBuffH);
            end;
          if not gotrefNum then
            begin
              i := FSClose(refNum);
              if err = 0 then
                err := i;
            end;
        end;
      if err <> noErr then
        begin
          Announce(StringOf('SaveMassaged: Error #', err : 1));
```

```
      end;
    end;        { we have recorded data. }
  end;          { SaveMassaged }

  procedure LoadMassaged; { (refNum : integer) }
{ prompt the user for a massaged file.  If one is found the load both the tree and the }
{ massaged data from it. }
    var
      Fname: str255;
      i, err, vRefNum: integer;
      l, count: longInt;
      fileHeader: MDfileHeaderType;
      TList: SFTypeList;
      gotrefNum: boolean;

    function ReadNewTree (trp: TreeRecPtr; numOfNodes: integer): integer;
    { Read the tree out of the file refNum and install it into mainTreePtr^ in place of }
    { whatever is currently there. }
      var
        i: integer;
        count: longInt;
        n: nodeDescType;
        Newnodes: array[1..maxStorage] of nodeDescType;
        nodeMap: array[1..maxStorage] of integer;
        p: PRecPtr;

      function ReadNode (var n: nodeDescType): integer;
        var   { Read the next node description from the file. }
          count: longint;
      begin
        count := sizeof(n);
        ReadNode := FSRead(refNum, count, @n);
      end;

    begin { ReadNewTree }
      if numOfNodes <> 0 then
        begin
          NewTree(trp);
          for i := 1 to numOfNodes do
            if err = noErr then
              err := ReadNode(Newnodes[i]);
          if err = noErr then
            begin
              with trp^.TreeRoot^ do        { First node is always world ptr. }
                begin
                  lSix := Newnodes[1].pos;
                  name := Newnodes[1].name;
                  LDown := (DLine in Newnodes[1].flags);
                  LRight := (RLine in Newnodes[1].flags);
                  nodeMap[1] := PtrtoL(trp, trp^.TreeRoot);
                  RecNodeNum := 0;      { Start to rebuild the recordedTree }
                  AddtoRecTree(trp, trp^.TreeRoot, false);  { first idx is always the root. }
                end;
```

```
        if err = noErr then
          for i := 2 to numOfNodes do
            begin
              with NewNodes[i], NewNodes[i].pos do
                p := InsertPt(trp, false, trp^.TreeRoot, pt.x, pt.y, pt.z, tt.roll, tt.pitch, tt.yaw, RLine in
    flags, DLine in flags, Name);
              { Set the serial/swivel output bits. }
              p^.flags := Newnodes[i].flags;
              nodeMap[i] := PtrtoL(trp, p);
              AddtoRecTree(trp, p, false);
            end;
          { Fix up all the pointers in the tree.  for each node, newNodes[i].?idx }
          { is an index into newnodes.  Using the nodeMap, turn that index into }
          { a pointer based on the index of storage[xx] in the tree. }
        for i := 1 to numOfNodes do
          with trp^.Storage[nodeMap[i]]^, NewNodes[i] do
            begin
              if i <> 1 then    { world point already points up to metaWorld. }
                up := IdxtoPtr(trp, PRecPtr(nodeMap[upIdx]));
              down := IdxtoPtr(trp, PRecPtr(nodeMap[downIdx]));
              right := IdxtoPtr(trp, PRecPtr(nodeMap[rightIdx]));
              rBandPtr := IdxtoPtr(trp, PRecPtr(nodeMap[rbIdx]));
            end;
      end;            { If read all the newNodes ok. }
    end;              { if number of newnodes <> 0 }
  checkTree(trp, false);
  ReadNewTree := err;
end; { ReadNewTree }

function MatchTreeNames: integer;
{ The user doesn't want to replace the current tree with the new tree, just match}
{ names so the massaged data will point to the same named nodes on the current tree. }
  var
    tempTree: TreeRec;
    i, err: integer;
    matched: boolean;
    str: nameStr;
    p: PRecPtr;
begin
  Announce('Overlaying Massaged Data on current tree.');
  InitTree(@tempTree, false);
  err := ReadNewTree(@tempTree, fileHeader.nodeNum);
  if err = noErr then
    begin
      matched := true;
      for i := 1 to RecNodeNum do
        if matched then
          with RecTreePtr^[i] do
            begin
              str := PRecName(IdxtoPtr(@tempTree, PRecPtr(idx)));  { get name of file tree }
              p := FindTreeName(mainTreePtr, str);      { does it exist in the }
              if p = nil then                           { current tree? }
                begin
```

```
                matched := false;                       { No.  can't do this. }
                Announce(concat('TreeNode ', str, ' not found.'))
              end
            else
              idx := PtrtoL(mainTreePtr, p); { Yes, correct Recorded index. }
          end;
      if not matched then
        err := 1000;
    end;
    MatchTreeNames := err;
  end;  { MatchTreeNames }

begin   { LoadMassaged }
  gotrefNum := (refNum <> 0);
  if not gotrefNum then
    begin
      TList[0] := MDfileType;
      OldFileIdent(Fname, vRefNum, 'Massaged Data to Load?', 1, TList);
    end;
  if gotrefNum or (Fname <> '') then
    begin
      if gotrefNum then
        err := noErr
      else
        err := FSOpen(Fname, vRefNum, refNum);
      if err = noErr then
        begin
          fileHeader.version := -1;
          count := sizeof(fileHeader);
          err := FSRead(refNum, count, @fileHeader);
          if (err = noErr) then
            if (fileHeader.version <> MDversion) then
              Announce('Sorry, that is an bad version Massage Data file.')
            else
              begin
                if optionIsDown then
                  err := MatchTreeNames
                else
                  begin
                    err := ReadNewTree(mainTreePtr, fileHeader.nodeNum);  { read the tree from file. }
                  end;
                if (err = noErr) and not gotrefNum then
                  begin { read the massaged data after the tree. }
                    ChangeRecMass(false);
                    err := GetFPos(refNum, l);
                    err := GetEOF(refNum, count);
                    l := count - l;
                    if (RecBuffH = nil) or (GetHandleSize(RecBuffH) < l) then
                      begin { The current massaged buffer is nil or not big enough }
                        DisposHandle(RecBuffH);
                        RecBuffH := NewHandle(l + 8);
                        err := MemError;
                      end;
```

```
                if RecBuffH = nil then
                  Announce('Couldn''t allocate enough memory for the buffer.')
                else
                  begin
                    ChangeRecMass(true);     { make sure the record buffer exists }
                    if RecMassOn then        { recording turned on ok. }
                      begin
                        count := GetHandleSize(RecBuffH) - 4;
                        err := FSRead(refNum, count, RecBuffH^);
                        if err = eofErr then  { eofErr is fine since count was max }
                          err := noErr;       { buffer size. }
                        recPtr.l := ord4(StripAddress(recBuffH^)) + count;
                        ChangeRecMass(false);
                      end;  { read the recorded data ok. }
                  end;      { if the massaged record buffer is big enough. }
              end;      { read the tree ok }
            end;      { read the header OK and it was the right version. }
          if not gotrefNum then
            begin
              i := FSClose(refNum);
              if err = noErr then
                err := i;
            end;
        end;    { open worked }
      end;    { if the user supplied a name }
    if err <> noErr then
      begin
        sysbeep(3);
        Announce(StringOf('Open Massaged failed, err = ', err : 1));
      end;
    HookupAllDMs;
  end;        { LoadMassaged }

  procedure axResource (rtype: ResType; id: integer);
    { If the given resource type/id exists in the current resource file the get rid of it. }
    var
      h: handle;
  begin
    h := Get1Resource(rtype, id);     { Remove any resource }
    if h <> nil then                  { with this type/ID. }
      begin
        RmveResource(h);
        DisposHandle(h);
      end;
  end;

  function PutDMs: integer;
{ Save all the current Data Massasge modules into the current resource file. }
    var
      i, j, err: integer;
      size: longInt;
      h: handle;
      dmglob: DMGlobRec;
```

```
begin
  err := 0;
  while Count1Resources(DMResType) <> 0 do
    begin   { Clear out any DMRec's already in this file. }
      h := Get1IndResource(DMResType, 1);
      if h <> nil then
        begin
          RmveResource(h);
          DisposHandle(h);
        end
      else
        AnnounceB('PutDMs: Get1IndResource(DMResType, 1) returned nil.');
    end;
  while Count1Resources(DMPrvType) <> 0 do
    begin { And clear out any private storage. }
      h := Get1IndResource(DMPrvType, 1);
      if h <> nil then
        begin
          RmveResource(h);
          DisposHandle(h);
        end
      else
        AnnounceB('PutDMs: Get1IndResource(DMPrvType, 1) returned nil.');
    end;

  dmglob.version := DMVersion;
  for i := 0 to maxDMTypes do
    if i <= topDMType then
      dmglob.TypeNames[i] := DMTypes[i].name
    else
      dmglob.TypeNames[i] := '';
  AddPtrResource(@dmglob, sizeof(DMGlobRec), DMGlobType, 0, 'DM globals');
  for i := 0 to numOfDMRec do
    if err = 0 then
      begin
        doVerb(fsaveDM, DMRecsPtr^[i]);
        AddPtrResource(@DMRecsPtr^[i], sizeof(DMRec), DMResType, i, DMRecsPtr^[i].name);
        err := ResError;
        if err = noErr then
          with DMRecsPtr^[i] do
            if private <> nil then
              begin
                size := GetPtrSize(private);      { Try to find the size of }
                if size > 0 then                    { a heap ptr. }
                  begin
                    AddPtrResource(private, size, DMPrvType, i, name);
                    err := ResError;
                  end
                else
                  begin            { heap pointed to by private }
                    h := RecoverHandle(private);
                    if h <> nil then                { we have a handle, save it. }
                      begin
```

```
                    AddResource(h, DMPrvType, i, name);
                    err := ResError;
                    WriteResource(h);
                    DetachResource(h);
                    MoveHHi(h);
                    HLock(h);
                    private := h^;
                  end;        { if a handle }
                end;          { if not a ptr. }
              end;            { with DMRecsPtr^[i], if private <> nil }
        doVerb(fopenDM, DMRecsPtr^[i]);   { bracket all fsaves with fopens. }
      end;                    { for i, if err = 0 }
    PutDMs := err;
    if err <> 0 then
      begin
        sysbeep(3);
        Announce(StringOf('Put Data massage error #', err : 1));
      end;
  end;    { PutDMs }

{    ***************    }

  procedure ShowError (err: integer; str: string);
  begin
    if err <> noErr then
      begin
        Announce(StringOf('Error ', err : 1, str));
      end;
  end;
  function MoveResource (h: Handle; toRes: integer; makeCopy: Boolean): integer;
    var
      i, id, err: integer;
      name: Str255;
      rtype: ResType;
  begin
    SetResAttrs(h, BAND(GetResAttrs(h), BNOT(resPurgeable)));     { Make sure the picture is purgable }
    GetResInfo(h, id, rType, name);
    ShowError(ResError, StringOf(' getting ', rType, ' info.'));
    MoveResource := id;
    LoadResource(h);
    if makeCopy then
      begin
        err := HandToHand(h);
        ShowError(err, StringOf(' making a copy of ', rType, ' resource.'));
      end
    else
      DetachResource(h);
    UseResFile(toRes);
    axResource(rType, id);
    AddResource(h, rType, id, name);
    ShowError(ResError, StringOf(' adding ', rType, ' resource.'));
    WriteResource(h);
    ShowError(ResError, StringOf(' writing ', rType, ' resource.'));
```

```
    SetResAttrs(h, BOR(GetResAttrs(h), resPurgeable));      { Make sure the picture is purgable }
    MoveResource := id;
  end;

{ PutPICTs and GetPICTS - Since BodyElectric doesn't leave DM files open while running, The PICTs }
{ that get displayed in the Flex window will be put into the application's resource fork and transfered }
{ when the DM is saved. }
  function PutPICTs (DMRes: integer): integer;
{ Move all the picture resources between FlexPICTstart and FlexPICTend from the application into }
{ the DM file.  It's resource fork is opened and is # DMRes.  The Application is resource }
{ file # ApplRes . }
    var
      id: integer;
      pi: PicInfoHandle;
      rh: RectHandle;
  begin
    DeletePICTs(DMres);
    pi := PicRoot;
    while pi <> nil do
      begin
        HLock(Handle(pi));
        with pi^^ do
          begin
            id := MoveResource(Handle(pi^^.pic), DMRes, true);
            rh := RectHandle(NewHandle(sizeof(Rect)));
            if rh <> nil then
              begin
                rh^^ := pi^^.bounds;
                axResource(RectResType, id);
                AddResource(Handle(rh), RectResType, id, 'for PICT');
                ShowError(ResError, StringOf(' adding ', RectResType, ' resource.'));
                WriteResource(Handle(rh));
              end;
          end;
        HUnlock(Handle(pi));
        pi := pi^^.next;
      end;
    PutPICTs := noErr;
  end;

  procedure DeletePicInfo;
    var
      pi: PicInfoHandle;
      h: Handle;
  begin
    pi := PicRoot;
    while pi <> nil do
      begin
        h := Handle(pi);
        pi := pi^^.next;
        DisposHandle(h);
      end;
    PicRoot := nil;
```

```
end;

function GetPICTs (DMRes: integer; merge: Boolean): integer;
{ Move all the picture resources between FlexPICTstart and FlexPICTend from }
{ the DM file into the Application.  It's resource fork is opened and is # DMRes.  The Application is resource }
{ file # ApplRes . }
  var
    i, j: integer;
    h, h1: Handle;
    pi: PicInfoHandle;
    r: Rect;
begin
  if not merge then
    DeletePicInfo;
  for i := flexPICTend downto flexPICTstart do
    begin
      UseResFile(DMres);
      h := Get1Resource('PICT', i);
      if h <> nil then
        begin
          if merge then
            begin   { when merging you want to add this as a new pict, not replace any existing pict. }
              h1 := Get1Resource(RectResType, i);
              if h1 = nil then
                r := PicHandle(h)^^.picFrame
              else
                r := RectHandle(h1)^^;
              DetachResource(h);
              ReleaseResource(h1);
              AddAsPic(h, r);
            end
          else
            begin
              pi := PicInfoHandle(NewHandle(sizeof(PicInfo)));
              if pi <> nil then
                begin
                  pi^^.next := PicRoot;
                  PicRoot := pi;
                  pi^^.pic := PicHandle(h);
                  pi^^.nextsel := nil;
                  pi^^.id := i;
                  j := MoveResource(h, ApplRes, false);
                  UseResFile(DMres);
                  h := Get1Resource(RectResType, i);
                  if h = nil then
                    pi^^.bounds := pi^^.pic^^.picFrame
                  else
                    begin
                      pi^^.bounds := RectHandle(h)^^;
                      ReleaseResource(h);
                    end;
                end;
            end;
```

```
        end;
      end;
    GetPICTs := noErr;
  end;

  function GetDMs (addto: boolean): integer;
{ Get Data Massage modules from the current resource file.  addto is true if you }
{ just add to the current list of DM's, otherwise close out all existing DM's. }
    var
      i, j, err, dmIdx: integer;
      h, hp: handle;
      dmp: DMRecPtr;
      dmgp: DMGlobRecPtr;
      cptr: ^chars;
      goodtoAdd: boolean;

    function ConvertDM (h: Handle): DMRec;
        { Do some conversions of old DM's to the current DM.  h is a handle to an old DM. }
        { dmgp^.version is the version number of the DM pointed to by h.  Any private storage for }
        { the DM hasn't been loaded yet and shouldn't be in here.  h will be released later so leave it as it is. }
        { If the version numbers didn't match up this routine shouldn't have been called so it shouldn't error. }
      var
        tempDM: DMRec;
        cptr: ^chars;
        i: integer;

      procedure Convert3to4;
          { Convert version 3 DM's to version 4 DM's.  The DM's were changed when }
          { I implemented different DM input/output types.  CLB 7/8/89 }
        type
          InputDef3 = record
              ptrto: IntPtr;
              kind: InputKind;
              inIdx: signedByte; { if kind= frmTree, sixAxisType. if DM, dm out index. }
              name: nameStr;
            end;

    { PointDef describes where a DM puts its information. }
          PointDef3 = record
              ptrto: PRecPtr;
              lastvalue: integer;
              name: nameStr;
              SixAxis: SixAxisType;
            end;

    { DMRec has all the information needed to describe a DataMassage module. }
          DMRec3 = record
              private: Ptr;                    { Ptr to private storage for this module. }
              massageProc: Ptr;              { address of proc massage(dm:DMRec); }
              typeIdx: DMTypeIndex;          { index into the DMTypes array for kind. }
              state: DMmodState;                 { whether this is on, off, etc. }
              inputs, outputs: integer;       { number of inputs and outputs }
              SlotsIn: array[0..maxDMInput] of InputDef3;
```

```
        PointsOut: array[0..maxDMOutput] of PointDef3;
        name: nameStr;
        dyMenuItem: integer;
        visLoc: point;              { location in flex window. }
        dispLast: boolean;          { true if showing in DM window. }
        dispIdx: integer;               { start index of display in DM window. }
        flexH: FlexHandle;          { Flex window visual representation }
        privateWords: array[0..5] of integer; { used by individual dm's. }
        unused: packed array[1..20] of byte; { padded with some extra bytes. }
      end;
  var
    dm_for3: DMRec3;
    i: integer;
begin       { Convert 3 to 4 }
  ZeroMem(@dm_for3, sizeof(DMRec3));
  BlockMove(h^, @dm_for3, MinOf(GetHandleSize(h), sizeof(DMRec3)));
      { Go through field by field copying the old version to the new. }
  with tempDM do
    begin
      private := dm_for3.private;
      massageProc := dm_for3.massageProc;
      typeIdx := dm_for3.typeIdx;
      state := dm_for3.state;
      inputs := dm_for3.inputs;
      outputs := dm_for3.outputs;
      for i := 0 to maxDMInput do
        with SlotsIn[i] do
          begin
            ptrfrm := nil;
            kind := dm_for3.SlotsIn[i].kind;
            inIdx := dm_for3.SlotsIn[i].inIdx;
            inType := intD;
            Name := dm_for3.SlotsIn[i].Name;
          end;
      for i := 0 to maxDMOutput do
        with PointsOut[i] do
          begin
            ptrto := nil;
            LastValue.i := dm_for3.PointsOut[i].lastValue;
            outType := intD;
            Name := dm_for3.PointsOut[i].Name;
            SixAxis := dm_for3.PointsOut[i].SixAxis;
          end;
      name := dm_for3.name;
      dyMenuItem := dm_for3.dyMenuItem;
      visLoc := dm_for3.visLoc;
      dispLast := dm_for3.dispLast;
      dispIdx := dm_for3.dispIdx;
      flexH := dm_for3.flexH;
      for i := 0 to 5 do
        privateWords[i] := dm_for3.privateWords[i];
    end;
end;
```

```
begin
  HLock(h);
  FillDMDefault(tempDM);
  if dmgp^.version = 3 then
    Convert3to4
  else if dmgp^.version = 4 then
    begin
       { Zero out any new fields that didn't requirea version change. }
      ZeroMem(@tempDM, sizeof(DMRec));
      tempDM := DMRecPtr(h^)^;
    end
  else
    Announce(StringOf('Can''t convert version ', dmgp^.version : 1, ' version DM''s.'));
  ConvertDM := tempDM;
end;

procedure fixDMTypeIndex (var tIdx: DMTypeIndex);
{ if the name of the kind of DM this was saved as is not the same }
{ as the kind that is in that postion now, try to find a matching name. }
  var
    newIdx, len: integer;
    nametofind: NameStr;
  function findTypeName (findname: NameStr): integer;
    var
      i: integer;
  begin
    findTypeName := -1;
    for i := 0 to maxDMTypes do
      with DMTypes[i] do
        if (name <> '') and (findname = name) then
          begin
            findTypeName := i;
            leave;
          end;
  end;
begin
  nametofind := dmgp^.TypeNames[tIdx];
  newIdx := findTypeName(nametofind);
  if newIdx = -1 then
    begin { This type of DM module wasn't found. }
      len := length(nametofind);
      if (nametofind[len] > '0') and (nametofind[len] <= '6') then
        begin
          Delete(nametofind, len, 1);
          newIdx := findTypeName(nametofind);
        end;
      if newIdx = (-1) then
        begin
          newIdx := 0;
          sysbeep(3);
        end;
      Announce(StringOf('Data Massage Type ''', dmgp^.TypeNames[tIdx], ''' no longer exists, '));
```

```
        AnnounceB(StringOf('  Converting to "', DMTypes[newIdx].name, '".'));
      end;
    tIdx := newIdx;
  end;

begin
  err := noErr;
  h := Get1Resource(DMGlobType, 0);
  if h = nil then
    err := ResError
  else
    begin
      hLock(h);
      dmgp := DMGlobRecPtr(h^);
      with dmgp^ do
        if (version <> DMVersion) then
          if ((version = 3) or (version = 4)) and (DMVersion = 5) then
            Announce(StringOf('Converting version ', version : 1, ' DM''s to version ', DMVersion : 1, '.'))
          else
            begin
              Announce(StringOf('Can''t convert version ', dmgp^.version : 1, ' version DM files.'));
              Announce(' Use the 6/89 Texpo version of BodyElectric to convert to version 3, then');
              AnnounceB(StringOf(' run this again to convert to version ', DMVersion : 1, '.'));
              err := 1024; { bad version }
            end;
      if err = noErr then
        begin
          if addto then
            dmIdx := numOfDMRec
          else
            begin  { close out all the existing DM modules }
              while DeleteDMmodule(0, false) do   { This closes all, one by one. }
                ;
              dmIdx := -1;
              FlexRedo(true);
            end;
          i := -1;
          repeat
            i := i + 1;

            goodtoAdd := true;
            if dmIdx >= maxDMRec then
              goodtoAdd := trytoGetMoreSpace;
            if not goodtoAdd then   { no more DM slots. }
              h := nil
            else
              begin
                dmIdx := dmIdx + 1;
                h := Get1Resource(DMResType, i);
              end;
            if h <> nil then   { DM module exists for this index. }
              begin
                HLock(h);
```

```
if dmgp^.version <> DMVersion then
  DMRecsPtr^[dmIdx] := ConvertDM(h)
else
  begin
     { Zero out any new fields that didn't requirea version change. }
    ZeroMem(@DMRecsPtr^[dmIdx], sizeof(DMRec));
    dmp := DMRecPtr(h^);
    DMRecsPtr^[dmIdx] := dmp^;
  end;
ReleaseResource(h);
hp := Get1Resource(DMPrvType, i);
if hp <> nil then      { Private storage exists for this DM. }
  begin
    DetachResource(hp);
    MoveHHi(hp);
    HLock(hp);
    DMRecsPtr^[dmIdx].private := hp^;
  end
else
  DMRecsPtr^[dmIdx].private := nil;
with DMRecsPtr^[dmIdx] do
  begin
    dyMenuItem := 0;  { no menu exists when loaded. }
    flexH := nil;       { also no flex display exists. }
    if state = on then { do this so HookupIO won't report }
      state := off;      { weird errors. }
    dispIdx := -1;       { no display index when loaded. }
    turnsOnOff := false;   { don't know if it turns on/off yet. }
    if dispLast then
      SetDisplay(DMRecsPtr^[dmIdx], true);
    fixDMTypeIndex(DMRecsPtr^[dmIdx].TypeIdx);
    with DMRecsPtr^[dmIdx] do
      begin
      { Check to make sure the inputs or outputs required hasn't changed. }
        if (DMTypes[typeIdx].inputs >= 0) and (DMTypes[typeIdx].inputs <> inputs) then
          begin
            Announce(StringOf('Num of Inputs has changed for DM "', name, '". '));
            for j := inputs to DMTypes[typeIdx].inputs do
              SlotsIn[j].name := '';
            inputs := DMTypes[typeIdx].inputs;
          end;
        if (DMTypes[typeIdx].outputs >= 0) and (DMTypes[typeIdx].outputs <> outputs)
then
          begin
            Announce(StringOf('Num of Outputs has changed for DM "', name, '". '));
            for j := outputs to DMTypes[typeIdx].outputs do
              PointsOut[j].name := '';
            outputs := DMTypes[typeIdx].outputs;
          end;
      end;
    HookupIO(DMRecsPtr^[dmIdx]);

    doVerb(fopenDM, DMRecsPtr^[dmIdx]);
```

```
                if state = off then{ now turn all off's to on so any not hooked }
                  state := on;        { up will be announced by ReHookIO. }
              end;  { with }
            end;
          until h = nil;

          numOfDMRec := dmIdx - 1;
        end;    { if version is the right one. }
      h := RecoverHandle(ptr(dmgp));
      HUnlock(h);              { free the global resource }
      ReleaseResource(h);
    end;       { If found DM version record. }
  GetDMs := err;
end;    { GetDMs }

function dmioOpenDMs; {•      vref : integer;•}
                      {•      fname : string;•}
                      {•      merge: boolean): integer;•}
  var  { Try to get Data Massage modules from this file.  return 0 if successful. }
    ResNum, err, oldVref, i: integer;
begin
{   DeSelectAll; }
  err := GetVol(nil, oldVref);
  err := SetVol(nil, vRef);
  if err = noErr then
    begin
    ResNum := OpenResFile(fName);
    if ResNum < 0 then
      err := ResError
    else
      begin
        err := GetDMs(merge);
        if err = noErr then
          err := GetPICTs(ResNum, merge);
        CloseResFile(ResNum);
      end;
    end;
  dmioOpenDMs := err;
  err := SetVol(nil, oldVref);
  InvalRect(mainTreePtr^.wp^.portRect);
end;

function dmioSaveDMs; {•      vref : integer;•}
                      {•      fname : string): integer;•}
{ Try to save the tree into this file.  return true if successful. }
  var
    ResNum, err, oldVref, i: integer;
    fndrInfo: FInfo;

begin
  err := GetVol(nil, oldVref);
  err := SetVol(nil, vRef);
  if err = 0 then
```

```
    begin
      CreateResFile(fName);
      ResNum := OpenResFile(fName);
      if ResNum >= 0 then
        begin
          err := PutDMs;
          if err = noErr then
            err := PutPICTs(ResNum);
          CloseResFile(ResNum);
          if err = 0 then
            err := GetFInfo(fName, vRef, fndrInfo);
          if err = 0 then
            begin
              fndrInfo.fdType := DMFileType;
              fndrInfo.fdCreator := AppType;
              err := SetFInfo(fName, vRef, fndrInfo);
            end;{ if GetFInfo worked. }
        end { if opened resource file }
      else
        err := ResError;
    end;        { if set volume }
   dmioSaveDMs := err;
   err := SetVol(nil, oldVref);
   HookupAllDMs;
 end;    { SaveDMs }

end.
```

```
{ The type definitions for DM's is in DMTypes.pas.  This has global }
{ variables. }

{ A Data Massage module is the data structure that describes the }
{ inputs, outputs and type of code that operates on the module. }
{ DMGlobals describes the data structures that the Data Massage Modules use. }
{ DMGlobals also has one routine AcquireRefresh; which does one cycle of }
{ Acquiring Data and Refreshing the screen.  This is mostly for DM modules that }
{ want to do calibration and need changing rawData values and feedback to the user. }


unit DMGlobals;
interface
  uses
    ChuckStuff, AutoLib, FastStuff, Globals, Tree3DGlob, {}
    MiscRoutines, DataAqUnit, formTree3D, TreeRender, TreeEdit, Tree3D, DMTypes;

  const

    DMGlobType = 'DMgb';    { Global information for DM's.  defined in DMGlobRec }
    DMResType = 'DMs ';     { Data Massage resource type. }
    DMPrvType = 'DMpv';     { Data Massage private storage resource type. }

    DMFileType = 'DSDM';    { Data Massage file type for finder. }
    DMVersion = 5;          { Current version for DM files. }
    MDFileType = 'DSMD';    { Massaged data file type for finder. }
    MDVersion = 1;          { Current version for MD files. }

    { Definitions for the DMlist dialog box.  This is also used by the scripts list. }
    DMListID = 2004;        { list of DM's dialog box }
    EdDMaddItem = 2;
    EdDMdelItem = 3;
    EdDMedItem = 4;
    ListItem = 5;
    ResetItem = 7;
    OnOffItem = 8;

  { Range PICT resources are in that are considered part of the flex window. }
    FlexPICTstart = 3000;
    FlexPICTend = 3100;

  { Opcode definitions }
    PUSH_IML_Op = $2f3c;        { move.l    #<long>, -(sp)   }
    PUSH_D0W_Op = $3f00;     { move.w  d0, -(sp)        }
    PUSH_IMW_Op = $3f3c;        { move.w    #<word>, -(sp)   }
    MOVEW_IM_Op = $303c;        { move.w    #<word>, d0      }
    MOVEW_D0D0_Op = $3000; { move.w     d0,d0            }
    JSR_ABS_Op = $4eb9;         { jsr <long>                 }
    D0_to_Mem_Op = $33c0;       { move.w    d0, <long>       }
    Mem_to_D0_Op = $3039;       { move.w    <long>, d0       }
    SUBQ_2_SP = $558f;          { subq.l    #2,sp            }
    SUBQ_4_SP = $598f;          { subq.l    #4,sp            }
```

```
  PUSHW_MEM = $3f39;          { move.w  <addr>, -(sp) }
  PULLW_D0 = $301f;           { move.w    (sp)+, d0         }
  DEBUG_Trap = $a9ff;         { _Debugger                   }
  RTS_Op = $4e75;                { rts                         }

  maxDMclips = 75;            { max number of DM's that can be held in the clipboard. }
  maxDMgroups = 20;           { max number of pop-up menu groups for DM types. }
  MaxDMslots = 50;            { max number of slots in the DM's window. }
type

  DMRecsType = array[0..5000] of DMRec;
  DMRecsPtrType = ^DMRecsType;

  DMTypeRec = record
     name: nameStr;
        { Everything from here on down can be specified by a 'DMtp' resource with the name the code
      expects. }
     inputs, outputs: integer;
     inTypes: array[0..maxDMInput] of DSet;         { Kind of inputs this DM allows (int, real, etc) }
     outTypes: array[0..maxDMOutput] of DSet;       { Kind of outputs this DM allows. }
     defaultOut: array[0..maxDMOutput] of DType;    { Default output when DM is created. }
     IconID: Integer;
        { Everything from here on down exists only when the code runs and is set by the app code. }
     kind: DMType;
     massageProc: Ptr;
     codeRes: boolean;                                 { true if this is a code resource. }
     verbProc: ProcPtr;
    end;

  CodeArType = array[0..32000] of integer;
  CodePtrType = ^CodeArType;
  CodeHandleType = ^CodePtrType;
var

  FlexWPtr: WindowPtr;       { Window ptr for the flex window. }
  { describeStr is a string that modules fill when asked to describe themselves. }
  describeStr: str255;

  { DMverbMod may be used as a modifier to expand some verbs.  ie: CalibPartDM }
  { uses it to determine whether to save first point (1), second point(2) or calibrate(3). }
  DMverbMod: longInt;

  { DMRecsPtr^ is the array that holds all of the DM records currently active. }
  DMRecsPtr: DMRecsPtrType;
  numOfDMRec: integer;       { number of DM modules currently used.  0..numOfDMRec }
  maxDMRec: longint;

  { DMClipBoard[] has handles to all the DMRec's currently in the clipboard. }
  DMClipBoard: array[0..maxDMclips] of DMRecHandle;
  numOfDMClip: integer;      { number of DM modules in the clipboard. }

  DataMassageAddr: Ptr;      { Address of DataMassage for AcquireRefresh }
```

```
  HandleDMMenusAddr: Ptr;  { Address of HandleDMMenus for AddDMMenu. }

  { DMTypes describe all the different types of Data Massage modules there are. }
  topDMType: integer;

  DMTypes: array[0..maxDMTypes] of DMTypeRec;

  DMSlotDesc: SlotDesc;
  DMDataDef: array[0..MaxDMSlots] of SlotDefType;
  DMinfo: DMInfoType;
  CodeHandle: CodeHandleType;     { Handle to Code written on the fly to execute DM's. }
  NextWord: integer;              { Index into CodeHandle used while writing the code. }
  CallDMCode: boolean;            { True if the CodeHandle^ is called instead of calling each DM in turn. }

  DMOffsetList: array[1..maxDMgroups] of integer;
  currentDMgroups: integer;

  DMCodeInvalid: Boolean;    { Set to true if any dm's turn other dm's on/off thus making the dmcode
     invalid. }

 function trytoGetMoreSpace: Boolean;
 function SixAxisName (s: SixAxisType): string;
 procedure AcquireRefresh;
 procedure EnDisDMmenu (var dm: DMRec);
 procedure AddDMMenu (var dm: DMRec; title: string);
 procedure DelDMMenu (var dm: DMRec);
 function NewPvt (size: longInt): Ptr;
 procedure DisposPvt (var pvt: Ptr);
 procedure doClose (var dm: DMRec);
 function SlotName (slot: InputDef): string;

 procedure Add_Word (word: integer);
 procedure Add_2Word (word1, word2: integer);
 procedure Add_Long (l: longInt);
 procedure Add_Addr (addr: Ptr);
 procedure AddDMCall (var dm: DMRec);
 procedure Add_MovetoD0 (addr: Ptr);
 procedure Add_MovetoDn (addr: Ptr; n: integer);
 procedure Add_MoveImDn (value, n: integer);
 procedure Add_MoveDntoDn (f, t: integer);
 procedure Add_MovefrmD0 (addr: Ptr);
 procedure Add_MovefrmDn (addr: Ptr; n: integer);
 procedure SetSixthType (p: PRecPtr; sixIdx: integer; NewValue: DRec; d: DType);
 procedure Add_D0toLastValue (var pd: PointDef);

 procedure GenericHandle (v: DMVerb;     { DM module type. }
             var dm: DMRec);

 procedure DisplayInDM (var dm: DMRec; str: string);


implementation
```

```
  { Try to increase the size of the DM array by newDMs so you can put more in it. }
function trytoGetMoreSpace;
  const
    newDMs = 15;
    minHeapSpace = 32000;
  var
    error: integer;
    goodAttempt: Boolean;
    h: handle;
    sizeofH: longint;

begin
  goodAttempt := false;

  if (minHeapSpace < FreeMem) then
    begin

      h := recoverHandle(ptr(DMRecsPtr));
      HUnlock(h);

      sizeofH := GetHandleSize(h);
      SetHandleSize(h, sizeofH + (longint(newDMs) * sizeof(DMRec)));
      error := MemError;

      HLock(h);
      DMRecsPtr := DMRecsPtrType(h^);

      if (error = 0) then
        begin
          maxDMRec := maxDMRec + newDMs;
          goodAttempt := true;
        end
      else
        begin
          Sysbeep(3);
          Announce('Sorry, no more Data Massage modules can be allocated.');
        end;

    end
  else
    begin
      sysbeep(3);
      announce('Caution: You are low on memory.  Save your files.  No new DMs can be added');
    end;
  trytoGetMoreSpace := goodAttempt;
end;


function SixAxisName; { (s : SixAxisType) : string }
{ Return the string for this sixAxisType. }
begin
  case s of
    xAxis:
```

```
      SixAxisName := 'X';
    yAxis:
      SixAxisName := 'Y';
    zAxis:
      SixAxisName := 'Z';
    yawAxis:
      SixAxisName := 'Yaw';
    pitchAxis:
      SixAxisName := 'Pitch';
    rollAxis:
      SixAxisName := 'Roll';
  end;      { Case }
end;

{ Any DM can call this routine.  It Acquires new raw data and redraws the tree. }
 procedure AcquireRefresh;
 begin
   DataAcquisition;                { Update the RawArray }
   call(DataMassageAddr);          { Do any active DM modules. }
   TreeRender(mainTreePtr);        { Refresh the tree. }
 end;

 procedure EnDisDMmenu; { (var dm : DMRec) }
   var
     item: integer;
 begin
   if dm.dyMenuItem > 0 then
     begin   { This has a menu item.  Disable it if the module is not on, else enable. }
       item := dyItemtoItem(DMMHndl, dm.dyMenuItem);
       EnDisItem(DMMHndl, item, (dm.state = on));
     end;
 end;

 procedure AddDMMenu;  { (var dm : DMRec; title : string); }
{ Add a dynamic menu item to the DM menu for this DM module.  When the user }
{ selects the menu item the DM module will get a menuHitDM message. }
{ If this DM module already has a menu item, then the text of the item is set to the }
{ passed text. }
   var
     item: integer;
 begin
   item := dyItemtoItem(DMMHndl, dm.dyMenuItem);
   if item > 0 then { this dm already has a menu item. }
     begin   { delete, then insert so if there are any meta-chars they are reconized. }
       DelMenuItem(DMMHndl, item);
       InsMenuItem(DMMHndl, title, item - 1);
     end
   else
     dm.dyMenuItem := dyNewItem(DMMHndl, title, HandleDMMenusAddr, true);
 end;

 procedure DelDMMenu; { var dm: DMRec) }
{ If this DM has a dynamic menu item then delete it.  If it doesn't have one then }
```

```
{ just return. }
  begin
    with dm do
      if dyMenuItem > 0 then        { if this had a menu item then make sure }
        begin                       { that it is gone. }
          if dyDelItem(DMMHndl, dyMenuItem) then
            ;
          dyMenuItem := 0;
        end;
  end;

  function NewPvt (size: longInt): Ptr;
    { Allocate new space for a DM's private variables.  Return a ptr to the allocated space. }
    { Make it a locked handle so when space is low memory can be compacted. }
    var
      h: Handle;
  begin
    h := NewHandle(size);
    if h <> nil then
      begin
        MoveHHi(h);
        HLock(h);
        NewPvt := h^;
      end
    else
      NewPvt := nil;
  end;
  procedure DisposPvt (var pvt: Ptr);
    { Dispose the space pointed to by the private ptr. }
    var
      h: Handle;
  begin
    if pvt <> nil then
      begin
        h := RecoverHandle(pvt);
        if MemError = noErr then
          DisposHandle(h);
      end;
    pvt := nil;
  end;

  procedure doClose; { (var dm: DMRec) }
    { Generic close for alot of DM's.  Close the DM and free up private storage. }
  begin
    DisposPvt(dm.private);
    dm.private := nil;
    dm.state := off;
    DelDMMenu(dm);              { Delete any menu items. }
  end;

  function SlotName; { (slot: InputDef): string }
    { Return a name for this slot, either 'X-foo' for tree, '1-foo' for DM's or 'foo' for Raw. }
    var
```

```
    SixName: string;
  begin
   with slot do
    begin
     if (kind = frmRaw) or (name = '') then
      SlotName := name
     else
      begin
       case slot.kind of
        frmTree:
         SixName := 'xyzYPR';
        frmDM:
         SixName := '123456';
       end;
       SlotName := concat(SixName[inIdx + 1], '-', name);
      end;
    end;
  end;

{-----------------------------------------------------}
{  The following routines are here to help DM's write the code }
{  to execute themselves. They don't have to be able to do this }
{  but if they can they can use these routines to help out. }

  procedure Add_Word; {•(word: integer);•}
   { Add the given 16-bit value to the end of the object code being generated. }
  begin
   if NextWord + 32 > GetHandleSize(Handle(CodeHandle)) div 2 then
    begin
     Announce('Out of DM code space.');
    end
   else
    begin
     CodeHandle^^[NextWord] := word;
     NextWord := NextWord + 1;
    end;
  end;
  procedure Add_2Word (word1, word2: integer);
  begin
   Add_Word(word1);
   Add_Word(word2);
  end;
  procedure Add_Addr;{• (addr: Ptr);•}
   { Add the given 32-bit address to the end of the object code being generated. }
   var
    lptr: ^Ptr;
  begin
   if NextWord + 16 > GetHandleSize(Handle(CodeHandle)) div 2 then
    begin
    end
   else
    begin
     lptr := Pointer(@CodeHandle^^[NextWord]);
```

```
      lptr^ := addr;
      NextWord := NextWord + 2;
    end;
  end;
  procedure Add_Long (l: LongInt);
  begin
    Add_Addr(Ptr(l));
  end;
  procedure AddDMCall;{• (var dm: DMRec);•}
{   Add the code nesessary to call this DM.  If it is a standard DM write code like callMassage() }
{   else write code like CallResDM().  }
{       either like:   procedure callMassage (var dm: DMRec; procPtr: Ptr); }
{       or:            procedure CallResDM (v: DMVerb; var dm: DMRec; DMinfo: DMInfoType; proc:
         ProcPtr); }
  begin
    if DMTypes[dm.typeIdx].codeRes then
      begin
        Add_Word(PUSH_IMW_Op);      { push massageDM verb }
        Add_Word(ord(massageDM));
        Add_Word(PUSH_IML_Op);      { push dm addr }
        Add_Addr(StripAddress(@dm));
        Add_Word(PUSH_IML_Op);      { push DMinfo Addr }
        Add_Addr(@DMInfo);
        Add_Word(JSR_ABS_Op);           { jsr to massageProc }
        Add_Addr(dm.massageProc);
      end
    else
      begin
        Add_Word(PUSH_IML_Op);      { push dm addr }
        Add_Addr(@dm);
        Add_Word(JSR_ABS_Op);           { jsr to massageProc }
        Add_Addr(dm.massageProc);
      end;
  end;
  procedure Add_MovetoD0; {•(addr: Ptr);•}
  begin   { Add code for move.w  <addr>,d0  }
    Add_Word(Mem_to_D0_Op);
    Add_Addr(addr);
  end;
  procedure Add_MovefrmD0; {•(addr: Ptr);•}
  begin   { Add code for move.w  d0, <addr> }
    Add_Word(D0_to_Mem_Op);
    Add_Addr(addr);
  end;
  procedure Add_MovetoDn; {•(addr: Ptr; n: integer);•}
  begin   { Add code for move.w  <addr>,dn  where n is register number 0-7  }
    Add_Word(Mem_to_D0_Op + BSL(n, 9));
    Add_Addr(addr);
  end;
  procedure Add_MovefrmDn; {•(addr: Ptr; n: integer);•}
  begin   { Add code for move.w  d0, <addr> }
    Add_Word(D0_to_Mem_Op + n);
    Add_Addr(addr);
```

```
end;
procedure Add_MoveImDn; {•(value, n: integer);•}
begin { Add code for move.w #<value>,dn where n is register number 0-7 }
  Add_Word(MOVEW_IM_Op + BSL(n, 9));
  Add_Word(value);
end;
procedure Add_MoveDntoDn; {•(f, t: integer);•}
begin { Add code for move.w df,dt where f and t are register number 0-7 }
  Add_Word(MOVEW_D0D0_Op + f + BSL(t, 9));
end;

procedure SetSixthType (p: PRecPtr; sixIdx: integer; NewValue: DRec; d: DType);
  { Set the given point's degree of freedom based on the value in NewValue and the data type }
  { d. Depending on d, NewValue could be an int, long, fixed, real or a pointer to another point. }
  var
    i: integer;
begin
  case d of
    intD:
      i := NewValue.i;
    longD:
      i := NewValue.l;
    fixedD:
      i := hiWord(NewValue.f + $08000);
    realD:
      i := Round(NewValue.r);
    pointD:         { Copy just the x,y,z,roll,pitch,yaw values from the old to the new point }
      begin      { and apply constraints on them. }
        for i := 0 to 5 do
          SetSixth(p, i, NewValue.p^.lSix.s[i]);
      end;
  end;
  if d <> pointD then
    SetSixth(p, sixIdx, i);
end;

procedure Add_D0toLastValue; {•(var pd: PointDef);•}
begin { Add the code to move D0 to the lastvalue for this PointDef and to a point record }
      { if ptrto isn't nil. }
  with pd do
    begin
      if pd.outType = intD then
        begin { Add code for SetSixth(ptrto,SixAxis, value); integer is in D0.w }
          Add_MovefrmD0(@lastValue);
          if ptrto <> nil then
            begin
              Add_Word(PUSH_IML_Op);        { push ptrto }
              Add_Addr(Pointer(ptrto));
              Add_Word(PUSH_IMW_Op);      { push SixAxis int }
              Add_Word(ord(SixAxis));
              Add_Word(PUSH_D0W_Op);      { push D0.w }
              Add_Word(JSR_ABS_Op);        { push jsr SetSixth }
              Add_Addr(@SetSixth);
```

```
            end;
          end
        else
          begin                          { All other types are longs, so save into lastvalue. }
            Add_Word($23c0);             { move.l d0, <addr> }
            Add_Addr(@LastValue);
            if ptrto <> nil then
              begin { Add code for SetSixthType(ptrto,SixAxis, value,DType);  value is DRec in D0.  }
                Add_Word(PUSH_IML_Op);     { push ptrto }
                Add_Addr(Pointer(ptrto));
                Add_Word(PUSH_IMW_Op);     { push SixAxis int }
                Add_Word(ord(SixAxis));
                Add_Word($2F00);              {move.l  d0,-(sp)}
                Add_Word($1f3c);              { move.b #outtype, -(sp)  ; push outType }
                Add_Word(ord(pd.outType));
                Add_Word(JSR_ABS_Op);         { push jsr SetSixthType }
                Add_Addr(@SetSixthType);
              end;
          end;
      end;
  end;

{ GenericHandle handles doing everything to do on dirt simple DM's except the }
{ actual data massage.  Basically there is nothing to do except clear the last values }
{ on reset. }
  procedure GenericHandle; { (v : DMVerb; var dm : DMRec) }
    var
      i: integer;
    procedure resetLast;
      var
        i: integer;
    begin
      for i := 0 to dm.outputs - 1 do
        dm.PointsOut[i].LastValue.i := 0;
      for i := 0 to 5 do
        dm.privateWords[i] := 0;
    end;
  begin
    case v of
      initDM:             { Called once the first time this DM is started. }
        begin
          doClose(dm);
          resetLast;
        end;
      massageDM:          { Called once through the main loop.  do a massage }
        begin
        end;
      closeDM:
        doClose(dm);      { Called at the end of the program run.  Do whatever... }
      reHookedDM:
        ;
      fopenDM:            { This DM has just been read from a file.  If it's state is }
                          { on it was hooked up properly.  private points to the }
```

```
      begin             { private memory it had when saved. }
      end;
    fsaveDM:            { This DM is about to be saved to a file.  Do any changes }
      begin             { nessessary to private memory so it can be restored later. }
      end;
    calibDM:
      resetLast;            { Calibrate the DM module. }
    describeDM:
      describeStr := '';
    writeCodeDM:
      ;
    otherwise           { Should be no other. }
      sysbeep(3);
  end;      { case }
end;        { GenericHandle }

procedure DisplayInDM (var dm: DMRec; str: string);
  { Display the given string inside the given dm in the flex window. }
  var
    oldPort: GrafPtr;
    r: Rect;
begin
  if WindowOn(FlexWPtr) then
    begin
      GetPort(oldPort);
      SetPort(FlexWPtr);
      if dm.FlexH <> nil then
        begin
          r := dm.FlexH^^.boxRect;
          InsetRect(r, 2, 2);
          r.top := r.top + ((r.bottom - r.top) div 2);
          TextBox(Ptr(ord4(@str) + 1), length(str), r, teJustCenter);
        end;
      SetPort(oldPort);
    end;
end;

end.
```

```
{ This now has the type definitions for DM's.  The global variables }
{ used are in DMGlobals.  CLB 12/28/88 }

{ A Data Massage module is the data structure that describes the }
{ inputs, outputs and type of code that operates on the module.  }
{ DMGlobals describes the data structures that the Data Massage Modules use. }
{ DMGlobals also has one routine AcquireRefresh; which does one cycle of }
{ Acquiring Data and Refreshing the screen.  This is mostly for DM modules that }
{ want to do calibration and need changing rawData values and feedback to the user. }

{ Individual DM units should include DMTypes, DMGlobals.  DataMassage handles calling and }
{ editing the individual DM modules. }

unit DMTypes;
interface
 uses
   Globals, Tree3DGlob;

 const
   maxDMInput = 5;          { 6 DM inputs (0..5) }
   maxDMOutput = 5;         { 6 DM outputs (0..5) }
   maxDMTypes = 100;        { max number of DM module types. }

   MaxFrm = 15;         { max num of lines that can connect to the right side of a Flex }

 type

  { Type definitions for a Flex Record.  This is the record used to visually display }
  { DM's.  This record is just a transitory thing.  It is not saved between runs. }
  { The information in it is redundant, used just for quick display. }
  IOcount = 0..5;             { range for both left and right slots. }
  slotState = (nameOK, nameNIL, toFlex, toAbs, nada);
  FlexSlotRec = record
      fixPt: Point;
      state: slotState;
      name: NameStr;          { Otherwise this is it's name. }
      nameBox: Rect;
    end;

  leftRightType = (left, right);   { left is input, right is output. }

  FlexPtr = ^FlexRec;
  FlexHandle = ^FlexPtr;
  FlexRec = record
      nextSelH: FlexHandle;
      ison: boolean;
      selected: boolean;
      dmLines: Boolean;            { If true draw lines to other DM's. }
      boxRect,                   { in wind coordinates.  Size of name box. }
      boundRect: Rect;           { relative to boxRect.  bound of name and slot boxes. }
      text: string;          { Text to go into name box. }
```

```
      lineCount: array[leftRightType] of integer;
      slotInfo: array[leftRightType, IOcount] of FlexSlotRec;
      frmFlex: array[0..MaxFrm] of record
         frmH: FlexHandle;
         slot, toslot: Byte;
        end;
    end;

  SixAxisType = (xAxis, yAxis, zAxis, yawAxis, pitchAxis, rollAxis);

  { InputKind tells whether an input is from the rawData array or a }
  { point in the current threeD tree. }
  InputKind = (frmRaw, frmTree, frmDM);

  { The DType, DSet, DRec and DPtr have to do with the data types of DM's inputs and outputs. }
  {  It might be Integer, long, fixed, real etc.  intD must be first and undefD must be last. }
  { undef1, 2 and 3 are just here so this set can't fit in a byte and must be a word. }
  { intD = 16 bit signed integer, }
  { longD = 32 bit signed integer }
  {realD = 32 bit floating point number }
  { pointD = Ptr to a PointRec.  If on a DM input, ptrfrm points to a PointRec.  If DM output, LastValue^ =
     PointRec. }
  { sameD = (Only on Input).  Input[x] must be the same type as output[x]. }
  { pointListD = Pointer to an array of PRecPtr's terminated by a NIL. }

  DType = (intD, longD, fixedD, realD, pointD, sameD, pointListD, undefD, undef1, undef2, undef3);
  DSet = set of DType;
  DRec = record
     case DType of
       intD: (
          i: Integer;
       );
       longD: (
          l: LongInt;
       );
       fixedD: (
          f: Fixed;
       );
       realD: (
          r: Real;
       );
       pointD: (
          p: PRecPtr;
       );
   end;
DPtr = ^DRec;

{ InputDef describes where a DM module gets it's information. }
InputDef = record
   ptrfrm:  DPtr;
   kind: InputKind;      { what kind of thing this is comming from (raw, dm, tree) }
   inIdx: signedByte;    { if kind= frmTree, sixAxisType. if DM, dm out index. }
   inType: DType;        { What type of data this is hooked up to (integer,fixed,real, etc). }
```

```
    name: nameStr;
  end;

{ PointDef describes where a DM puts its information. }
PointDef = record
    ptrto: PRecPtr;
    LastValue: DRec;
    outType: DType;      { What kind of data is in LastValue (integer,fixed,real, etc). }
    name: nameStr;
    SixAxis: SixAxisType;
  end;

{ DMType is all the different types of DataMassage modules. }
{ Definitly not true anymore.  A few DM's use this field to differentiate }
{ between like things but most DM's are considered passRaw. }
DMType = (passRaw, scaleOffset, ExpCalib, Smooth, AveTwo, {}
  Aveby4, Aveby8, BigExpCalib, LinCalib, bigLinCalib, {}
  setDG2Bright, Delay, WrtFlash, ConstType, RobotMaster, RobotSlave, DMTypeEnd);

{ DMVerb are the commands to send to a DataMassage module. }
{ initDM        - called when a module is first created. }
{ closeDM       - about to delete this module. }
{ massageDM     - Should never happen.  massageProc called instead. }
{ reHookedDM- called everytime a module is rehooked up. }
{ fopenDM     - module has just been read from a file. }
{ fsaveDM     - module is about to be written to a file. }
{ calibDM       - calibrate this module. }
{ menuHitDM     - this module's menu item has just been hit by the user. }
{ describeDM    - put a one line description of yourself into the string describeStr. }
{ CalibPartDM- Script programable calibrate. first, second, calibrate. }
DMVerb = (initDM, closeDM, massageDM, reHookedDM, fopenDM, fsaveDM, {}
  calibDM, menuHitDM, describeDM, CalibPartDM, writeCodeDM);

{ DMmodState has the current state for a Data Massage module.  }
DMmodState = (on, off, usrOff);

DMTypeIndex = 0..maxDMTypes;

{ DMRec has all the information needed to describe a DataMassage module. }
DMRec = record
    private: Ptr;                    { Ptr to private storage for this module. }
    massageProc: Ptr;                { address of proc massage(dm:DMRec); }
    typeIdx: DMTypeIndex;          { index into the DMTypes array for kind. }
    state: DMmodState;               { whether this is on, off, etc. }
    inputs, outputs: integer;    { number of inputs and outputs }
    SlotsIn: array[0..maxDMInput] of InputDef;
    PointsOut: array[0..maxDMOutput] of PointDef;
    name: nameStr;
    dyMenuItem: integer;
    visLoc: point;                { location in flex window. }
    dispLast: boolean;               { true if showing in DM window. }
    turnsOnOff: boolean;          { true if this DM turns on/off so shouldn't write code. }
    dispIdx: integer;                { start index of display in DM window. }
```

```
      flexH: FlexHandle;                 { Flex window visual representation }
      privateWords: array[0..5] of integer;   { used by individual dm's. }
      noLines: Boolean;                        { If true don't draw lines to other DM's. }
      version: Byte;                     { versions always 0 unless the DM sets them. }
    end;
  DMRecPtr = ^DMRec;
  DMRecHandle = ^DMRecPtr;

  DMInfoType = record
      AcquireRefreshPtr: ProcPtr;
      GetStringsPtr: ProcPtr;
      SetSixthPtr: ProcPtr;
      DescribeStrPtr: StringPtr;
    end;

implementation

end.
```

T

```
{  DataGlove Initialization.  Stuff in here just needs to be called once. }
{  Copyright 1986 VPL Research Inc. }
{  Chuck Blanchard 10/16/86 }

unit Initialize;
interface
  uses
    CompileTime, ChuckStuff, AutoLib, Globals, serialTypes, Tree3DGlob, MiscRoutines, RawUnit, {}
    DataAqUnit, Tree3d, DMTypes, DMGlobals, DataMassage, ScriptGlob, {}
    FileIO, Scripts, HostCom, Swivel_Stuff, SGICom, DAconfiguration;

  const
    messWindID = 129;

  procedure CheckSysEnvirons;
  procedure SetApplRes;
  procedure InitThings;
  procedure SetDAConfig;
  procedure SetUpThings;

implementation

{$ifc Option(MC68881) }
    { Initialize the 688881 (or 2).  This is here so SysEnvirons can be checked before the FPP is initialized. }
  procedure InitFPState;
  inline
    $42a7,              {  clr.l     -(sp)     }
    $42A7,              {  clr.l     -(sp)     }
    $F21F, $9800;      {  fmovem.l   (sp)+,  fpcr/fpsr  }
{$endc }

  procedure CheckSysEnvirons;
{ At this point the toolbox is initialized but my window's, menus's etc aren't.  If this is running on the}
{ wrong type of mac just set Finished to true and exit. }
    var
      err, itemHit: integer;
      thisMac: SysEnvRec;
      errStr: string;
      dlog: DialogPtr;
  begin
    errStr := '';
    err := SysEnvirons(1, thisMac);
    if err <> noErr then
      errStr := StringOf('SysEnvirons error # ', err : 1, '.  Get a new Mac.')
    else
      with thisMac do
        begin
{$ifc Option(MC68020) }
          if (processor < env68020) then
            errStr := 'Sorry, this version can''t run on this processor.';
{$endc }
{$ifc Option(MC68881) }
```

```
        if not hasFPU then
          errStr := 'Sorry, This version needs a Floating Point co-processor.'
        else
          InitFPState;
{$endc }
      end;
    if errStr <> '' then
      begin
        ParamText(errStr, '', '', '');
        err := Alert(BadNewsID, nil);
        Halt;
      end;
  end;

  procedure SetApplRes;
    { Set what BodyElectric thinks is the file that has configuration resources in.  For now it is either }
    { the application itself, or if a file called 'BodyElectric.Config' is found that is used. }
    const
      ConfigName = 'BodyElectric.Config';
    var
      i: integer;
  begin
    applRes := CurResFile;          { First set to the application. }
    i := OpenResFile(ConfigName);
    if ResError = noErr then
      applRes := i;
  end;

  procedure SetupLimits;
  begin
    Screen := ScreenBits.Bounds;   {set the size of the screen}
    SetRect(DragArea, Screen.left + 4, Screen.top + 24, Screen.right - 4, Screen.bottom - 4);
    SetRect(GrowArea, Screen.left, Screen.top + 24, Screen.right, Screen.bottom);
  end;

  procedure SetupWindows;
    var
      wtype: myWindowTypes;
  begin
    SetupLimits;
    InitAutoWind(WindowMenu);
    InitAnnounce;
    InitRaw;
    Init3D;
    mainTreePtr := TreeRecPtr(NewPtr(sizeof(TreeRec)));
    clipTreePtr := TreeRecPtr(NewPtr(sizeof(TreeRec)));
    if (mainTreePtr = nil) or (clipTreePtr = nil) then
      begin
        Announce(StringOf('SetupWindows memory error #', MemError));
        finished := true;
      end
    else
      begin
```

```
      InitTree(mainTreePtr, true);
      InitTree(clipTreePtr, false);
    end;
  end;

  procedure SetupPointers;
{ Set up pointers to things low in the heap.  Do this as soon as posible after start }
{ up to avoid heap fragmentation. }
  begin
    SetupWindows;
  end;    { SetupPointers }

  procedure SetupMenus;
    var
      MenuTopic: MenuHandle;
      i: integer;
    function myAddMenu (menuID: integer; display: boolean): MenuHandle;
    { Get the menu resource, if display, add to menu bar, add to myMenuList and }
    { return the handle. }
      var
        i: integer;
        mh: MenuHandle;
        myErr: integer;
    begin
      mh := GetMenu(menuID);
      myErr := resError;
      if myErr <> 0 then
        announce(stringof('terrible error # ', myErr));
      if display then
        InsertMenu(mh, 0);
      i := 1;
      while myMenuList[i] <> nil do
        i := i + 1;
      myMenuList[i] := mh;
      myAddMenu := mh;
    end;

  begin
    InitDynamicMenu;
    for i := 1 to 10 do
      myMenuList[i] := nil;
    MenuTopic := GetMenu(AppleMenu);  {get the apple desk accessories menu}
    if MenuTopic = nil then
      begin
        Debugstr('SetupMenus error.');
        ExittoShell;
      end;
    AddResMenu(MenuTopic, 'DRVR');      {adds all names into item list}
    InsertMenu(MenuTopic, 0);           {put in list held by menu manager}
    FileMHndl := myAddMenu(FileMenu, not turnkey);
    if turnkey then
      FileM2Hndl := myAddMenu(File2Menu, true);
    EditMHndl := myAddMenu(EditMenu, true);   {always need for editing Desk Accessories}
```

```
  DAMHndl := myAddMenu(DAMenu, not turnkey);
  DMMHndl := myAddMenu(DMMenu, not turnkey);
  TreeMHndl := myAddMenu(TreeMenu, not turnkey);
  RenderMHndl := myAddMenu(RenderMenu, turnkey);

  if not turnkey then                             { If this isn't a turnkey system }
    scriptMHndl := myAddMenu(ScriptMenu, true)  { then add the whole script menu }
  else
    begin
      scriptMHndl := NewMenu(ScriptMenu, 'Data');   { else just add a menu title }
      InsertMenu(scriptMHndl, 0);                   { that scripts will be added to. }
    end;
  WindMHndl := myAddMenu(WindowMenu, true);

{$ifc for_SGIs}
  IsaacMHndl := myAddMenu(IsaacMenu, true);
{$endc}

  DrawMenuBar;          {all done so show the menu bar}

  PopUpMenu := GetMenu(popUpMenuID);
  InsertMenu(PopUpMenu, -1);

  tempPopMenu := GetMenu(tempPopMenuID);
  InsertMenu(tempPopMenu, -1);
  sixAxisPopMenu := NewMenu(sixAxisPopMenuID, 'sixAxis');
  InsertMenu(sixAxisPopMenu, -1);

{$ifc Profile_On }
  do_InitProfile;
  i := dyNewItem(EditMHndl, 'DumpProfile', @do_DumpProfile, true);
  i := dyNewItem(EditMHndl, 'ResetProfile', @do_ResetProfile, true);
{$endc }
 end;

{ InitMac has already been called to initialize the mac like things. }
 procedure InitThings;
 begin
  SetupMenus;
  FlushEvents(everyEvent, 0);      {clear events from previous program}
  SetUpPointers;
  GetDateTime(randSeed);
 end;

{------------------------------------------------------------------------}

 procedure SetDAConfig;
{ This sets the global variable configRec.  }
  const
   DAcfResType = 'DAcf';
   DAconfigID = 2100;
   DAcfBit1Item = 3;
  var
```

```
      h: Handle;
      p: ^DAconfigRec;
  begin
    DAconfig.bits := [GBIIBit, polhmBit, flashBit, clockBit];
    h := GetResource(DAcfResType, 0);
    if h <> nil then
      begin
        p := pointer(h^);
        DAconfig := p^;
        ReleaseResource(Handle(h));
      end;
    turnKey := turnKeyBit in DAconfig.bits;
    if not turnkey or inLSP then
      begin
        if optionIsDown then
          UserSetDAconfigure;        {calls routine in DAconfig.pas to display and set the data }
      end;
    turnKey := turnKeyBit in DAconfig.bits;
  end;


{-----------------------------------------------------------------------}
  procedure SetUpThings;
    var
      i: integer;
      r: Rect;
  begin

    SetRect(r, 180, 40, 510, 270);
    SetTextRect(r);

    lastPopUp := 1;

{$ifc Debug }
    Announce(StringOf('Running Debug version compiled on ', compdate, '.'));
{$endc }

    InitDataAq;
    InitDataMS;
    InitScripts;
    InitFileIO;
    Init_Swivel;

{$ifc for_SGIs  }
    InitSGI;
{$endc }

    InitCursor;            {ready to go, so show the Arrow cursor}
    i := PostEvent(app1Evt, ExStartupMsg + ApplStartBit);
    HookupFlag := false; { clear the DM's need to be rehooked up flag. }
  end;

end.
```

```
{ DynamicMenu items are menu items that can be added to and removed from }
{ menus without having to know their positions.  You call dyNewItem to install a }
{ new item, passing it's menu name and the address of the procedure to execute }
{ when the user hit's that item.  dyNewItem returns an integer that is a unique }
{ identifier for the menu name.  Even if items above it are deleted, when the item }
{ is hit, the given procedure will be executed, and passed the unique identifier. }
{   dyDelItem with the same identifier removes the item.  }
{   dyItemtoItem returns the current Mac menu item index for the given unique id. }
{   dyMenu tries to execute the procedure for a dynamic item.  It returns true if }
{ a menu item was found and executed. }

{ Copyright 1987, VPL Research, inc. }
{ ver 1.0 Chuck Blanchard 11/14/87 }

unit DynamicMenu;

interface

  procedure InitDynamicMenu;

    { mh is the menu handle to install the menu item in.  str is the name for the }
    { new item.  proc is a pointer to the code to execute.  Return a unique identifier. }
  function dyNewItem (mh: MenuHandle; str: str255; proc: Ptr; DashFirst: boolean): integer;

    { Delete the given menu and dynamic Item.  Return true if successful }
  function dyDelItem (mh: MenuHandle; dyItem: integer): boolean;

    { Given a menu handle and a unique identifier, return the mac menu item if found. }
  function dyItemtoItem (var mh: MenuHandle; dyItem: Integer): integer;

    { Given a menu handle and an item number.  If the item is a dynamic item then }
    { execute it and return true, else return false. }
  function dyMenu (mh: MenuHandle; Item_No: integer): boolean;
    { Given a menu ID and an item number.  If the item is a dynamic item then }
    { execute it and return true, else return false. }
  function dyMenuID (menuID, Item_No: integer): boolean;

    { Set the given dynamic menu item to have the given text.  do a delete/insert }
    { so meta-chars are reconized. }
  procedure dySetItem (dyItem: integer; str: str255);

implementation

  const
    mapMax = 30;        { max number of dynamic items in a menu. }
  type
    dynamicPtr = ^dynamicItems;
    dynamicHandle = ^dynamicPtr;
    dynamicItems = record
        mHandle: MenuHandle;
        firstItem:  integer;
        next: dynamicHandle;
```

```
      map: array[0..mapMax] of record
          publicIdx: integer;
          procAddr: Ptr
        end;
    end;

  var
    dynamicList: dynamicHandle;
    lastPublic: integer;

  procedure call (public: integer; procAddr: Ptr);
  inline
    $205F,   { move.l  (a7)+,a0 }
    $4E90;   { jsr     (a0)     }

  function findDyHandle (mH: MenuHandle; var dh: dynamicHandle): boolean;
{ Return true and the dynamic Ptr if the given menu handle is in the dynamic list. }
    var
      found: boolean;
  begin
    found := false;
    dh := dynamicList;
    while (dh <> nil) and not found do
      if dh^^.mHandle = mh then
        found := true
      else
        dh := dh^^.next;
    findDyHandle := found;
  end;

  procedure InitDynamicMenu;
  begin
    dynamicList := nil;
    lastPublic := 0;
  end;

{ Allocate a new menu Item onto the end of this menu handle. }
{ mh is the menu handle to install the menu item in.  str is the name for the }
{ new item.  proc is a pointer to the code to execute.  if DashFirst is true and this }
{ is the first dynamic menu item on this menu, then put a dashed line before this }
{ item.  Return a unique identifier. }
  function dyNewItem; {•(mh  : MenuHandle;•}
                       {•       str  : str255;•}
                       {•      proc : Ptr;•}
                       {•      DashFirst: boolean): Integer;•}
    var
      i: integer;
      go: boolean;
      dh: dynamicHandle;
  begin
    dyNewItem := -1;
    if not findDyHandle(mh, dh) then
      begin   { this is the first dynamic item on this menu. }
```

```
      dh := dynamicHandle(NewHandle(sizeof(dynamicItems)));
      dh^^.mHandle := mh;
      if (CountMItems(mh) >= 1) and DashFirst then
        AppendMenu(mh, '(-');
      dh^^.firstItem := CountMItems(mh) + 1;
      dh^^.next := nil;
      for i := 0 to mapMax do
        with dh^^.map[i] do
          begin
            procAddr := nil;
            publicIdx := -1;
          end;
      if dynamicList = nil then
        dynamicList := dh              { First dynamicItem in the list }
      else
        begin
          dh^^.next := dynamicList;    { add to begining of existing list }
          dynamicList := dh;
        end;
    end;
   HLock(Handle(dh));  { lock handle because AppendMenu might move it. }
   with dh^^ do
     begin
       AppendMenu(mh, str);
       lastPublic := lastPublic + 1;
       with map[CountMItems(mh) - firstItem] do
         begin
           publicIdx := lastPublic;
           procAddr := proc;
           dyNewItem := publicIdx;
         end;
     end;
   HUnlock(Handle(dh));
  end;    { dyNewItem }

  function dyItemtoItem; {(var mh : MenuHandle; dyItem : Integer) : integer }
{ Given a dynamic item number for menu mh, return the true item number. }
{ If mh is nil then search all the dynamic menu lists for this item.  If found then }
{ return both the menu item number and the menuHandle it was found in. }
{ Note that the true item number is only good until the dynamic menu is shuffled. }
   var
     menuItem: integer;
     dh: dynamicHandle;

   function SearchfordyItem (dh: dynamicHandle; dyItem: integer): integer;
     var
       i, j: integer;
   begin
     j := -1;
     for i := 0 to mapMax do
       if j < 1 then
         if dh^^.map[i].publicIdx = dyItem then
           j := i + dh^^.firstItem;
```

```
    SearchFordyItem := j;
  end;

begin
  menuItem := -1;
  if mh = nil then
    begin
      dh := dynamicList;
      while (dh <> nil) and (menuItem < 0) do
        menuItem := SearchFordyItem(dh, dyItem);
      if menuItem > 0 then
        mh := dh^^.mHandle;
      dh := dh^^.next;
    end
  else if findDyHandle(mh, dh) then
    menuItem := Searchfordyltem(dh, dyItem);
  dyItemtoItem := menuItem;
end;    { dyItemtoItem }

{ Given a menu handle and a unique identifier, delete the menu item if found. }
{ If mh is nil then search all the dynamic menu's for this item and delete if found. }
{ Return true if the delete was successful. }
 function dyDelItem;  { (mh : MenuHandle; dyItem : integer):boolean }
   var
     i, item: integer;
     dh: dynamicHandle;
 begin
   item := dyItemtoItem(mh, dyItem);
   if item > 0 then
     if findDyHandle(mh, dh) then
       begin
         Hlock(Handle(dh));
         with dh^^ do
           begin { remove item. }
             DelMenuItem(mh, item);
             for i := item - dh^^.firstItem to mapMax - 1 do
               map[i] := map[i + 1];
             map[mapMax].procAddr := nil;
             map[mapMax].publicIdx := -1;
           end;
         HUnlock(Handle(dh));
         dyDelItem := true;
       end
     else
       dyDelItem := false;
 end;    { dyDelItem }

{ Set the given dynamic Item with the given new string.  Do a delete/insert so }
{ meta-chars are taken care of. }
 procedure dySetItem; { (dyItem : integer; str : str255) }
   var
     item: integer;
     mh: MenuHandle;
```

```
  begin
    item := dyItemtoItem(mh, dyItem);
    if item > 0 then { this dynamic Item exists. }
      begin  { delete, then insert so if there are any meta-chars they are reconized. }
        DelMenuItem(mh, item);
        InsMenuItem(mh, str, item - 1);
      end
  end;

  function dyMenu; { (mh:MenuHandle; Item_No: integer):boolean }
{ This menu Item was selected.  If it is a dynamic menu item execute it, else }
{ return false. }
    var
      dh: dynamicHandle;
  begin
    dyMenu := false;
    if findDyHandle(mh, dh) then
      with dh^^ do
        begin { this is a dynamic menu. }
          if Item_No >= firstItem then { and this is a dynamic item. }
            with map[Item_No - firstItem] do
              if procAddr <> nil then
                begin
                  dyMenu := true;
                  call(publicIdx, procAddr);
                  HiliteMenu(0);
                end;
        end;
  end;    { dyMenu }

{ Call this in your Menu handle procedure to handle dynamic menus. }
  function dyMenuID; {  (menuID, Item_No : integer) : boolean }
    var
      mh: MenuHandle;
  begin
    mh := GetMHandle(menuID);
    if mh <> nil then
      dyMenuID := dyMenu(mh, Item_No)
    else
      dyMenuID := false;
  end;

end.
```

```
{ The main procedure in here EditDMList puts up the dialog box with the list of }
{ current DM's and lets the user Edit it. }

unit EdDMList;

interface
  uses
    ChuckStuff, AutoLib, Globals, {}
    Tree3DGlob, MiscRoutines, Tree3D, {}
    DMTypes, DMGlobals, HandleDMs, DMEdit, Flex;

  procedure FillDMDefault (var dm: DMRec);
  function AddDMmodule (doDialog: boolean): boolean;
  function DeleteDMmodule (i: integer; updateFlex: boolean): boolean;

  procedure EditDMList;

implementation

  var
    EdDMlistH: ListHandle;
    listBox: Rect;

  procedure FillDMDefault (var dm: DMRec);
    { Fill out the given dm with the default values. }
    const
      DefaultTypeIndex = 0;
    var
      i: Integer;
  begin
    with dm do
      begin          { Initialize a brand new DM module. }
        version := 0;
        TypeIdx := 0;
        state := off;
        inputs := DMTypes[DefaultTypeIndex].inputs;
        outputs := DMTypes[DefaultTypeIndex].outputs;
        massageProc := DMTypes[DefaultTypeIndex].massageProc;
        private := nil;
        dyMenuItem := 0;
        dispLast := false;
        dispIdx := -1;
        turnsOnOff := false;
        noLines := false;
        dm.name := '';
        flexH := nil;
        SetPt(visLoc, 10, 10);
        for i := 0 to maxDMInput do
          with dm.slotsIn[i] do
            begin
              ptrfrm := nil;
              kind := frmRaw;
              inIdx := 0;
```

```
            name := '';
          end;
      for i := 0 to maxDMOutput do
        with dm.PointsOut[i] do
          begin
            ptrto := nil;
            SixAxis := xAxis;
            name := '';
            outType := DMTypes[DefaultTypeIndex].defaultOut[i];
          end;
    end;
  end;

  function AddDMmodule; { (doDialog : boolean) : boolean }
{ Add a new DM to the end of the DM list. If doDialog is true then put up the }
{ EditDM dialog and let the user fill the DM info. If false then just make this }
{ a passRaw DM with 1 in, 1 out. Return true if the DM was successfully added }
{ (Enough room in the list and if doDialog the user clicked OK). }
    var
      dm: DMRec;
      i: integer;
      usrOK, goodtoAdd: boolean;
  begin
    AddDMmodule := false;
    goodtoAdd := true;
    if numOfDMRec >= maxDMRec then
      goodtoAdd := trytoGetMoreSpace;
    if goodtoAdd then
      begin
        FillDMDefault(dm);          { Initialize a brand new DM module. }
        if not doDialog then
          dm.name := 'Untitled'
        else
          dm.name := '';
        if doDialog then
          usrOK := EditDMmodule(dm);
        if usrOK or not doDialog then
          begin
            numOfDMRec := numOfDMRec + 1;
            DMRecsPtr^[numOfDMRec] := dm;
            AddDMmodule := true;
            FileDirty[dmFile] := true;
            HookupIO(DMRecsPtr^[numOfDMRec]);
            FlexAdd(DMRecsPtr^[numOfDMRec]);
            DMCodeInvalid := true;
          end
        else
          AddDMmodule := false;
      end;
  end;

  function DeleteDMmodule; { (i : integer: updateFlex: boolean) : boolean }
{ Delete the DM module number i from the DM list. }
```

```
  var
    j: integer;
begin
  if (i >= 0) and (i <= numOfDMRec) then
    begin
      DelDMMenu(DMRecsPtr^[i]);                { Delete any menu items. }
      doVerb(closeDM, DMRecsPtr^[i]);       { close the DM module before dispose. }
      with DMRecsPtr^[i] do
        if private <> nil then
          begin
            Announce(StringOf('DeleteDMmodule: ', name, ' private <> nil.'));
            doClose(DMRecsPtr^[i]);
          end;
      if DMRecsPtr^[i].dispLast then         { if displaying last values then }
        SetDisplay(DMRecsPtr^[i], false);    { remove them from the display list. }
      FlexDelete(DMRecsPtr^[i], updateFlex);
      for j := i + 1 to numOfDMRec do
        DMRecsPtr^[j - 1] := DMRecsPtr^[j];
      numOfDMRec := numOfDMRec - 1;
      FileDirty[dmFile] := true;
      DeleteDMmodule := true;
    end
  else
    DeleteDMmodule := false;
end;    { DeleteDMmodule }

function EdDMLFilter (dlg: DialogPtr; var evt: EventRecord; var itemHit: integer): boolean;
  var
    pt: Point;
    oldPort: grafPtr;
begin
  GetPort(oldPort);
  SetPort(dlg);
  EdDMLFilter := false;
  pt := evt.where;
  GlobaltoLocal(pt);
  case evt.what of
    mouseDown:
      if PtInRect(pt, listBox) then
        begin
          if LClick(pt, evt.modifiers, EdDMlistH) then
            itemHit := EdDMedItem{ double click occured }
          else
            itemHit := ListItem;
          EdDMLFilter := true;
        end;
    otherwise
      ;
  end;
  SetPort(oldPort);
end;

procedure EdDMLusrDraw (theWindow: WindowPtr; itemNo: integer);
```

```
    var
      r:  rect;
  begin
    r := listBox;
    insetRect(r, -1, -1);
    FrameRect(r);
    LUpdate(theWindow^.visRgn, EdDMlistH);
  end;

{ Edit the DataMassage module list. }
  procedure EditDMList;
    var
      i, j, hitItem: integer;
      t: DMType;
      dlogPtr: DialogPtr;
      ItemH: Handle;
      db, box: Rect;
      pt: Point;
      str: string;
      dm: DMRec;

    procedure SetItems;  { Set the state of controls in the EditDM dialog box. }
      var
        Itype, show: integer;
        box: Rect;
        itemH: Handle;
        itemCH: ControlHandle;
        c: cell;
    begin
      SetPt(c, 0, 0);
      GetDItem(dlogPtr, EdDMdelItem, Itype, itemH, box);
      if (numOfDMRec <> -1) then
        show := 0
      else
        show := 255;
      itemCH := pointer(ItemH);
      HiliteControl(itemCH, show);
    end;

    procedure DeleteOne;  { If an item is selected in the EdDM dialog box list }
      var                 { Then delete it. }
        c: Cell;
    begin
      SetPt(c, 0, 0);
      if LGetSelect(true, c, EdDMListH) then
        begin
          if DeleteDMmodule(c.v, true) then
            LDelRow(1, c.v, EdDMListH);
        end;
      SetItems;
    end;

    function onStr (dm: DMRec): string;
```

```
  begin
    with dm do
      if state = on then
        onStr := concat(' On: ', name)
      else
        onStr := concat('Off: ', name);
  end;

begin
  ParamText('Data Massage module list.', '', '', '');
  dlogPtr := GetNewDialog(DMListID, nil, Pointer(-1));
  GetDItem(dlogPtr, ListItem, i, ItemH, listBox);
  SetDItem(dlogPtr, ListItem, userItem, @EdDMLusrDraw, listBox);
  SetItems;
  box := listBox;
  box.right := box.right - 15;
  SetRect(db, 0, 0, 1, numOfDMRec + 1);
  SetPt(pt, 0, 0);
  EdDMlistH := LNew(box, db, pt, 0, dlogPtr, true, false, false, true);
  EdDMlistH^^.selFlags := lOnlyOne;
  for i := 0 to numOfDMRec do
    begin
      pt.v := i;
      pt.h := 0;
      str := onStr(DMRecsPtr^[i]);
      LSetCell(pointer(ord4(@str) + 1), length(str), pt, EdDMlistH);
    end;
  repeat
    ModalDialog(@EdDMLFilter, hitItem);
    case hitItem of
      EdDMaddItem:
        if numOfDMRec >= maxDMRec then
          sysbeep(3)
        else
          begin
            if AddDMmodule(true) then
              begin
                str := onStr(DMRecsPtr^[numOfDMRec]);
                i := LAddRow(1, numOfDMRec, EdDMlistH);
                SetPt(pt, 0, numOfDMRec);
                LSetCell(pointer(ord4(@str) + 1), length(str), pt, EdDMlistH);
                SetItems;
              end;
            AcquireRefresh;
            SelectWindow(dlogPtr);
          end;
      EdDMdelItem:
        DeleteOne;
      EdDMedItem:
        begin
          SetPt(pt, 0, 0);
          if LGetSelect(true, pt, EdDMListH) then
            begin
```

```
            dm := DMRecsPtr^[pt.v];
            if EditDMmodule(dm) then
              begin
                DMRecsPtr^[pt.v] := dm;
                str := onStr(DMRecsPtr^[pt.v]);
                LSetCell(pointer(ord4(@str) + 1), length(str), pt, EdDMlistH);
                FileDirty[dmFile] := true;
              end;
            AcquireRefresh;
            SelectWindow(dlogPtr);
          end
        else
          sysbeep(1);
      end;
    ResetItem:
      begin
        SetPt(pt, 0, 0);
        if LGetSelect(true, pt, EdDMListH) then
          begin
            doVerb(calibDM, DMRecsPtr^[pt.v]);
            FileDirty[dmFile] := true;
          end
        else
          sysbeep(1);
      end;
    OnOffItem:
      begin
        SetPt(pt, 0, 0);
        if LGetSelect(true, pt, EdDMListH) then
          begin
            if DMRecsPtr^[pt.v].state <> on then
              begin
                DMRecsPtr^[pt.v].state := on;
                HookupIO(DMRecsPtr^[pt.v]);
              end
            else
              DMRecsPtr^[pt.v].state := usrOff;
            str := onStr(DMRecsPtr^[pt.v]);
            LSetCell(pointer(ord4(@str) + 1), length(str), pt, EdDMlistH);
            FileDirty[dmFile] := true;
          end
        else
          sysbeep(1);
      end;
    otherwise
      ;
  end;   { case }
 until hitItem <= 1;
 ReorderDMs(false);
 LDispose(EdDMlistH);
 DisposDialog(dlogPtr);
 UnloadSeg(@EditDMmodule);
end;   { EditDMList }
```

```
end.
```

```
unit EditScriptUnit;
interface
  uses
    ChuckStuff, Globals, Tree3dGlob, AutoLib, {}
    fastStuff, MiscRoutines, Tree3D, DMTypes, DMGlobals, HandleDMs, ScriptGlob, FileIO, ScriptParse;

  function FindScript (name: str255): ScriptHandle;
  function FindCmd (var params: paramArray): CmdType;
  procedure doText (on: boolean; text: str255);
  procedure postKeys (str: string);

  procedure scCloseText;
  procedure scOpenText;
  procedure doWriteText (str: str255);

  procedure ChangeOwner (sh: ScriptHandle; newInFile: InFileType);
  procedure EditScript (sh: ScriptHandle);

implementation

  const
    ScriptEditID = 2007;
    NameEdItem = 1;
    NameItem = 4;
    TextItem = 10;

    FirstRadioItem = 6;

  var
    hTE: TEHandle;          { handle to script textedit text. }
    takeKeys: boolean;      { true if hTE is currently taking the keyboard input. }
    NameRect: Rect;         { copy of where the rect is for ScriptEdit name. }

  function FindScript; { (name : str255) : ScriptHandle }
    var   { try to find the named script.  return nil if not found. }
      sh: ScriptHandle;
      found: boolean;
      str:  str255;
  begin
    lowcase(name);
    FindScript := nil;
    if ScriptsRoot <> nil then
      begin
        sh := ScriptsRoot;
        found := false;
        while not found and (sh <> nil) do
          begin
            str := sh^^.name;
            lowcase(str);
            if str = name then
              found := true
            else
              sh := sh^^.next;
```

```
        end;
      if found then
        FindScript := sh;
    end;
  end;

  function FindCmd; { (var params : paramArray) : CmdType }
    var
      c: CmdType;
      found: boolean;
      i: integer;

    function paramIsNode (pnum: integer): boolean;
{   return true if the params [ pnum ] is the name of a tree node . }
      var
        p: PRecPtr;
    begin
      paramIsNode := false;
      with params[pnum] do
        begin
          p := FindTreeName(maintreeptr, str);
          if p = nil then
            gv.errStr := concat('Point "', str, '" not found.')
          else
            paramIsNode := true;
        end;
    end;          { paramIsNode }
    function paramIsDM (pnum: integer; var dmIdx: integer): boolean;
    begin
      paramIsDM := false;
      with params[pnum] do
        begin
          dmidx := FindDM(str, true);
          if dmidx = -1 then
            gv.errStr := concat('Data Massage module "', str, '" not found')
          else
            paramIsDM := true;
        end;
    end;
    function paramIsSixAxis (pnum: integer; var six: integer): boolean;
    begin
      paramIsSixAxis := false;
      with params[pnum] do
        begin
          lowcase(str);
          six := strIsSix(str);
          if six < 0 then
            gv.errStr := 'illegal parameter';
          if gv.errStr = '' then
            paramIsSixAxis := true;
        end;
    end;
```

```
begin  { FindCmd }
  lowcase(params[0].str);
  FindCmd := cNo;
  if (params[0].tok in strToks) and (params[0].str <> '') then
    begin
      found := false;
      c := cNo;
      while not found and (c <> cExecute) do
        begin
          c := succ(c);
          if Cmds[c].name = params[0].str then
            found := true;
        end;
      if not found then
        gv.errStr := 'Unreconized command'
      else
        begin
          for i := 1 to 5 do
            if found then
              with params[i] do
                case Cmds[c].pType[i] of
                  pNo:
                    found := (tok = cr);
                  pStr:
                    found := (tok in strToks);
                  pInt:
                    found := (tok in intToks + [bool]);
                  pDM:
                    begin
                      found := (tok in strToks);
                      if found then
                        found := paramIsDM(i, params[i].int);
                    end;
                  pNode:
                    begin
                      found := (tok in strToks);
                      if found then
                        found := paramIsNode(i);
                    end;
                  pSix:
                    begin
                      found := (tok in strToks);
                      if found then
                        found := paramIsSixAxis(i, params[i].int);
                    end;
                  pVar:
                    found := (tok in [strVar, intVar]);
                  pIVar:
                    found := (tok = intVar);
                  pSVar:
                    found := (tok = strVar);
                  pEh:
                    ;
```

```
            end; { case }
         if found then
           FindCmd := c
         else if gv.errStr = '' then
           gv.errStr := 'Illegal parameter';
       end;         { if command found }
    end;
  end;    { findCmd }

  procedure doText; { (on : boolean; text : str255) }
{ handle turning the text dialog box on or off and displaying the given text. }
  begin
    repeat
    until Ticks^ > TextTick + (2 * 60);
    if not on then
      begin
        if textup then
          DisposDialog(TextdPtr);
        textup := false;
        TextTick := Ticks^ - (5 * 60);
      end
    else
      begin
        if not textup then
          TextdPtr := GetNewDialog(justTextID, nil, pointer(-1));
        PositionWindow(TextdPtr, 5, 5);
        SetDlgText(TextdPtr, statText, 1, text);
        textup := true;
        TextTick := Ticks^;
        ShowWindow(TextdPtr);
        DrawDialog(TextdPtr);
      end;
    repeat
    until Ticks^ > TextTick + 30;
  end;       { doText }

  procedure scCloseText;
    { If there is a script text file currently open then close it. }
  begin
    if scTextOpen then
      begin
        Close(scTextFile);
        scTextOpen := false;
      end;
  end;

  procedure scOpenText;
    { If a script text file isn't currently open then ask the user for a file and open it. }
    var
      Name: str255;
      vRef, oldRef, err: integer;
  begin
    if scTextOpen then
```

```
      scCloseText;
    if not scTextOpen then
      begin
        NewFileIdent(Name, vRef, 'TextOut', 'Text file to write to?');
        if Name <> '' then
          begin
            err := GetVol(nil, oldRef);
            err := SetVol(nil, vRef);
            ReWrite(scTextFile, Name);
            err := SetVol(nil, oldRef);
            scTextOpen := true;
          end;
      end;
  end;

  procedure doWriteText (str: str255);
    { Write the given string out the the opened script text file followed by a carrige return. }
    { If there isn't a text file opened call scTextOpen to open it. }
    var
      Name: str255;
      vRef: integer;
  begin
    if not scTextOpen then
      scOpenText;
    if scTextOpen then
      writeln(scTextFile, str);
  end;

  procedure postKeys; {(str : string)}
{ Post the given string into the event queue so it looks like they were typed. }
    var
      i, j, err: integer;
  begin
    for i := 1 to length(str) do
      begin
        err := PostEvent(keyDown, ord(str[i]));
      end;
  end;

{----------------------------}
{ Edit the script pointed to by sh }
{----------------------------}
  procedure ChangeOwner;{(sh : ScriptHandle; newInFile : InFileType) }
{ change the owner type of the script sh. Do any updating nessessary. }
    var
      i: integer;
      markChars: packed array[1..4] of char;
  begin
    if TreeRad in [NewinFile, sh^^.inFile] then
      FileDirty[treeFile] := true;
    if DMRad in [NewinFile, sh^^.inFile] then
      FileDirty[dmFile] := true;
    sh^^.inFile := NewinFile;
```

```
   if showOwner then
     begin
       i := dyItemtoItem(scriptMHndl, sh^^.dyItem);
       markChars := 'atdn';
       SetItemMark(scriptMHndl, i, markChars[ord(NewinFile) + 1]);
     end;
 end;

 function myFilter (dlg: DialogPtr; var evt: EventRecord; var itemHit: integer): boolean;
   var
     pt: Point;
     oldPort: grafPtr;
     ch: char;
 begin
   GetPort(oldPort);
   SetPort(dlg);
   myFilter := false;
   pt := evt.where;
   GlobaltoLocal(pt);
   case evt.what of
     mouseDown:
       if PtInRect(pt, hTE^^.viewRect) then
         begin
           if not takeKeys then
             TEActivate(hTE);
           takeKeys := true;
           TEClick(pt, (BitAnd(evt.modifiers, shiftKey) <> 0), hTE);
           itemHit := TextItem;
           myFilter := true;
         end
       else if PtInRect(pt, NameRect) then
         begin
           takeKeys := false;
           TEDeactivate(hTE);
         end;
     keyDown, autoKey:
       if takeKeys then
         begin
           ch := chr(BitAnd(evt.message, $FF));
           myFilter := true;
           itemHit := TextItem;
           if BitAnd(evt.modifiers, cmdKey) <> 0 then
             begin
               case ch of
                 'x', 'X':
                   TECut(hTE);
                 'c', 'C':
                   TECopy(hTE);
                 'v', 'V':
                   TEPaste(hTE);
               end;
             end
           else
```

```
        TEKey(ch, hTE);
      end;
    otherwise
      if takeKeys then
        TEIdle(hTE);
  end;
  SetPort(oldPort);
end;

procedure DrawTE (theWindow: WindowPtr; itemNo: integer);
  var
    r: rect;
begin
  r := hTE^^.viewRect;
  insetRect(r, -3, -3);
  FrameRect(r);
  TEUpdate(hTE^^.viewRect, hTE);
end;

procedure EditScript; { (sh : ScriptHandle) }
  { Edit the given script. This puts up the big dialog box that lets you edit all }
  { the parameters about the current script. }
  var
    dlogPtr: DialogPtr;
    ItemH: Handle;
    box: Rect;
    itemHit, i, j, rtype: Integer;
    l: LongInt;
    oldFont, oldSize: integer;
    NewinFile: inFileType;

  procedure SetEdits;
    var
      i, itype: integer;
      str: str255;
      ItemH: Handle;
      box: Rect;
      oldPort: GrafPtr;
  begin
    GetPort(oldPort);
    SetPort(dlogPtr);
    GetDItem(dlogPtr, NameItem, Itype, itemH, NameRect);
    SetEdText(dlogPtr, NameEdItem, sh^^.name);
    GetDItem(dlogPtr, TextItem, Itype, itemH, box);
    SetDItem(dlogPtr, TextItem, Itype, @DrawTE, box);
    takeKeys := false;
    oldFont := thePort^.txFont;
    oldSize := thePort^.txSize;
    TextFont(geneva);
    TextSize(9);
    hTE := TENew(box, box);
    TEAutoView(true, hTE);
    TextFont(oldFont);
```

```
    TextSize(oldSize);
{•   hTE^^.crOnly := -1;            { new line only on return. •]}
    HLock(sh^^.textHandle);
    i := GetHandleSize(sh^^.textHandle);
    TESetText(sh^^.textHandle^, GetHandleSize(sh^^.textHandle), hTE);
    HUnlock(sh^^.textHandle);
    i := TEFromScrap;
    if crntFname[dmFile] = '' then
      EnDisDItem(dlogPtr, firstRadioItem + ord(DMRad), false);
    if crntFname[treeFile] = '' then
      EnDisDItem(dlogPtr, firstRadioItem + ord(TreeRad), false);
    RadioRange(dlogPtr, firstRadioItem, ord(noneRad) + 1, ord(sh^^.inFile));
    NewinFile := sh^^.inFile;
    SetPort(oldPort);
  end; { SetEdits }

  procedure GetEdits;
    var
      i, err: integer;
      text, str: str255;
      rType: ResType;
  begin
    GetEdText(dlogPtr, NameEdItem, text);
    if text <> sh^^.name then
      begin
        sh^^.name := text;
        i := dyItemtoItem(ScriptMHndl, sh^^.dyItem);
        if i > 0 then
          begin
            DelMenuItem(ScriptMHndl, i);            { do this so meta-chars will work. }
            InsMenuItem(ScriptMHndl, text, i - 1);
          end;
        GetResInfo(sh^^.textHandle, i, rType, str);
        SetResInfo(sh^^.textHandle, i, text);
      end;
    if TreeRad in [NewinFile, sh^^.inFile] then
      FileDirty[treeFile] := true;
    if DMRad in [NewinFile, sh^^.inFile] then
      FileDirty[dmFile] := true;
    if sh^^.inFile <> NewinFile then
      ChangeOwner(sh, NewInFile);
    err := PtrToXHand(hTE^^.hText^, sh^^.textHandle, hTE^^.teLength);
  end; { GetEdits }

begin
  ParamText('Script List', '', '', '');
  dlogPtr := GetNewDialog(ScriptEditID, nil, Pointer(-1));
  SetEdits;
  repeat
    ModalDialog(@myFilter, itemHit);
    if (itemHit >= firstRadioItem) and (itemHit <= firstRadioItem + ord(noneRad)) then
      begin
        RadioRange(dlogPtr, firstRadioItem, ord(noneRad) + 1, itemHit - firstRadioItem);
```

```
        NewinFile := inFileType(itemHit - firstRadioItem);
      end;
  until itemHit <= 2;  { Until OK or Cancel is clicked. }
  if ZeroScrap <> 0 then
    ;
  i := TEToScrap;
  if itemHit = 1 then
    begin { OK clicked. }
      GetEdits;
    end; { if the user clicked OK. }
  TEDispose(hTE);
  DisposDialog(dlogPtr);
 end;     { EditScript }

end.
```

```
{  EthernetGlue.pas - Glue routines from pascal to c. }
{  © VPL Research, Inc.  Chuck Blanchard 4/29/89 }


unit EtherGlue;
interface

  uses
    CompileTime, ChuckStuff, AutoLib, Globals, MiscRoutines;

{$ifc for_SGIs  }

{ Set to false to test SGICom without an Ethernet card. }
{$setc DOIT=true     }

  const
    sizeOf_UDP_Info = 150;

    { UDP errors }
    commandTimeout = -23016;

  type
    UDP_info = record
      foo: packed array[0..sizeOf_UDP_Info] of char;
     end;
    UDP_infoPtr = ^UDP_info;

  var
    ShowWrite, ShowBytes: Boolean;

  function EthAddrtoStr (addr: LongInt): string;
  function StrtoEthAddr (str: string): LongInt;

  function InitEthernet: integer;
  function EtherOpen (var info: UDP_Info): OSErr;

  function EtherReadHere (var info: UDP_info; var here: boolean): OSErr;
  function EtherRead (var info: UDP_Info; buffPtr: Ptr; var count: longInt; var who: longInt; sync:
       Boolean): OSErr;
  function EtherWrite (var info: UDP_Info; buffPtr: Ptr; var count: longInt; who: longInt; sync: Boolean):
       OSErr;

  function CloseEthernet (var info: UDP_Info): integer;

 {$endc }

 implementation

 {$ifc for_SGIs  }
```

```
const
  SGI_ADDR = $C02AAC05;          { Used only when doit = false }

type
  OpNames = (Null, OK, SendTree, FullTree, Change, Reset, Quit, View, Eye, EyeDone, {}
    Load, SetNTSC, SetRGB, PutFile, ChangeAttr);
  OpNamesPtr = ^OpNames;


function OpenEtherDriver (str: string): integer;
external;
function ET_Open (var info: UDP_Info): integer;
external;
function ET_ReadsPending (var info: UDP_Info): integer;
external;

function ET_Read (var info: UDP_Info; buffPtr: Ptr; var countPtr: LongInt; var whoAddr: LongInt;
      async: Boolean): integer;
external;
function ET_Write (var info: UDP_Info; buffPtr: Ptr; var countPtr: LongInt; whoAddr: LongInt; async:
      Boolean): integer;
external;
function ET_Close (var info: UDP_Info): integer;
external;

function EthAddrtoStr; { (addr: LongInt): string }
  { Turn this Ethernet address into a string in the form xx.xx.xx.xx }
  var
    i: integer;
    str: string;
begin
  str := '';
  for i := 0 to 3 do
    begin
      if i <> 0 then
        str := concat('.', str);
      str := concat(StringOf(BitAnd(addr, $FF) : 1), str);
      addr := BitShift(addr, -8);
    end;
  EthAddrtoStr := str;
end;

function StrtoEthAddr; { (str: string): LongInt }
  { Turn this string in the form xx.xx.xx.xx into an Ethernet address. }
  var
    i: integer;
    addr, b: LongInt;
    s: string;
begin
  addr := 0;
  while str <> '' do
    begin
```

```
      i := pos('.', str);
      if i <> 0 then
        begin
          s := Copy(str, 1, i - 1);
          Delete(str, 1, i);
        end
      else
        begin
          s := str;
          str := '';
        end;
      StringToNum(s, b);
      addr := BitShift(addr, 8) + b;
    end;
  StrtoEthAddr := addr;
end;

procedure Jsleep (jif: integer);
  { Sleep for the requested number of jiffy counts.   }
  var
    t: longInt;
begin
  if false then
    begin
      Announce(StringOf('Jsleep ', jif : 1, ' jiffies.'));
      t := Ticks^ + jif;
      repeat
      until Ticks^ > t;
    end;
end;

procedure AnnounceBytes (p: ptrsType; count: integer);
  const
    perline = 16;
  var
    i: integer;
    str: str255;
begin
  str := '';
  for i := 0 to (count div 2) - 1 do
    begin
      if (str <> '') and ((i mod perline) = 0) then
        begin
          Announce(str);
          str := '';
        end;
      str := concat(str, ' ', NumtoHex(p.ip^, 4));
      p.l := p.l + 2;
    end;
  if (str <> '') then
    Announce(str);
end;
```

```
 function InitEthernet; { integer; }
  var
   pb: ParamBlockRec;
   str: string;
   err: integer;
 begin
  InitEthernet := noErr;
  Announce('InitEthernet');
{$ifc DOIT }
  InitEthernet := OpenEtherDriver('.ipp');
  showWrite := false;
{$elsec }
  InitEthernet := noErr;
  showWrite := true;
{$endc }
  jSleep(30);
  showBytes := false;
 end;

 function EtherOpen; { (var info: UDP_Info; addr: LongInt): integer }
 begin
  Announce(StringOf('EtherOpen'));
{$ifc DOIT }
  EtherOpen := ET_Open(info);
{$elsec }
  EtherOpen := noErr;
{$endc }
  jSleep(30);
 end;

 function EtherReadHere; {  (var info: UDP_info; var here: boolean): OSErr }
  { Return here = true if there is a packet waiting on the input stream. }
  var
   i: integer;
 begin
{$ifc DOIT }
  i := ET_ReadsPending(info);
  here := (i > 0);
  if i < 0 then
   begin
   end;
{$elsec }
  here := not OptionIsDown;
{$endc }
  EtherReadHere := noErr;
 end;

 function EtherRead; { (var info: UDP_Info; buffPtr: Ptr; var count: longInt; var who: longInt; sync:
      Boolean): integer }
 begin
  if false then
   Announce('EtherRead');
{$ifc DOIT }
```

```
   EtherRead := ET_Read(info, buffPtr, count, who, sync);
   jSleep(10);
{$elsec }
   count := 6;
   EtherRead := 0;
   if false then
     StuffHex(buffPtr, '00060002')
   else
     StuffHex(buffPtr, '00060001');
   who := SGI_ADDR;
{$endc }
 end;

 function EtherWrite; { (var info: UDP_Info; buffPtr: Ptr; var count: longInt; who, longInt; sync:
      Boolean): integer }
   var
     err: integer;
 begin
{$ifc DOIT }
   err := ET_Write(info, buffPtr, count, who, sync);
   jSleep(10);
{$elsec }
   err := noErr;
{$endc }
   if showWrite then
     begin
       if OptionIsDown then
         showBytes := not showBytes;
       Announce(StringOf('EtherWrite: count= ', count : 1, ', opcode= ', OpNamesPtr(ord4(buffPtr) + 3)^, ',
        who= ', EthAddrtoStr(who)));
       if showBytes then
         AnnounceBytes(ptrstype(buffPtr), count);
     end;
   EtherWrite := err;
 end;

 function CloseEthernet;{ (var info: UDP_Info) : integer }
 begin
   Announce('CloseEthernet');
{$ifc DOIT }
   CloseEthernet := ET_Close(info);
   jSleep(30);
{$endc }
 end;

{$endc }

end.
```

```
unit exScript;
interface

  uses
    ChuckStuff, AutoLib, Globals, Tree3dGlob, FastStuff,{}
    DMTypes, MiscRoutines, DataAqUnit, DMGlobals, HandleDMs,{}
    DataMassage, ScriptGlob, ScriptParse, EditScriptUnit, forExScript;

  function ExecuteScript (sh: ScriptHandle; passedStr: str255): boolean;

implementation

  function ExecuteScript; { (sh : ScriptHandle; passedStr : str255):boolean; }
{ Execute the script sh.  This can be called recursivly so a script can execute }
{ another script. }
    var
      i: integer;
      last: paramRec;
      cmdStart: integer;
      vars: varRecord;
      str: str255;
      params: paramArray;
      show, newLine: boolean;
      event: EventRecord;
      t: longInt;
      labels: array[1..20] of record
          offset: integer;
          name: nameStr;
        end;
      numOfLabels: integer;

    procedure doOKCancel (str: string);
    begin
      if not OKCancel(str) then
        gv.errStr := 'Aborted by user.';
    end;

    procedure ExtractParams;
{ Read 0 to 4 parameters from this line of the script.  Set the parameter types. }
      var
        i: integer;
    begin
      for i := 0 to 5 do
        with params[i] do
          begin
            tok := ExtractExpression(last);
            params[i] := last;
          end;
    end;  { ExtractParams }

    procedure SetStartParams (str: str255);
      var { extract the parameters from the string sent to execute. }
```

```
      iidx, sidx: integer;
      tok: token;
  begin
    iidx := 0;
    sidx := 0;
    gv.offset := 0;
    gv.textPtr := CharsPtr(ord4(@passedStr) + 1);
    gv.charCount := length(passedStr);
    tok := ExtractExpression(last);
    while tok <> cr do
      begin
        if tok = litstr then
          begin
            gv.strs[sidx] := last.str;
            sidx := sidx + 1;
          end
        else if tok = litint then
          begin
            gv.ints[iidx] := last.int;
            iidx := iidx + 1;
          end;
        tok := ExtractExpression(last);
      end;
  end;

  procedure ExecuteAnother;
  { Call Execute recursivly, passing any parameters . }
    var
      newsh: ScriptHandle;
      newStr: str255;
      tok: Token;
      flag: boolean;
  begin
    newsh := FindScript(params[1].str);
    if newsh = nil then
      gv.errStr := 'Script not found.'
    else
      begin { replace all variable's with their current value. }
        gv.offset := params[2].pos;
        newStr := '';
        repeat
          tok := ExtractExpression(last);
          if tok in strToks then
            newStr := concat(newStr, ' "', last.Str, '"')
          else if tok in intToks + [bool] then
            newStr := concat(newStr, ' ', ntos(last.Int))
          else if tok <> cr then
            gv.errStr := 'Illegal parameter';
        until (tok = cr) or (gv.errStr <> '');
        if gv.errStr = '' then
          begin
            vars := gv;
            flag := ExecuteScript(newsh, newStr);
```

```
        gv := vars;
        if flag then
          gv.errStr := ''
        else
          gv.errStr := concat('Error in SubScript "', params[1].str, '".');
      end;
    end; { if named script found }
  end; { ExecuteAnother }

  procedure FindLabels;
    var
      tok: Token;
  begin
    gv.offset := 0;
    numOfLabels := 0;
    gv.errStr := '';
    repeat
      tok := ExtractExpression(last);
      lowCase(last.Str);
      if tok in strToks then
        if last.Str = 'label' then
          begin
            tok := ExtractExpression(last);
            if tok in strToks then
              begin
                lowCase(last.Str);
                numOfLabels := numOfLabels + 1;
                labels[numOfLabels].offset := last.pos;
                labels[numOfLabels].name := last.Str;
              end;
          end;
      repeat
      until ExtractSym(last) = cr;
      gv.offset := gv.offset + 1;          { inc past the return }
    until (gv.offset >= gv.charCount) or (gv.errStr <> '');
  end;
begin  { ExecuteScript }
  Hlock(sh^^.textHandle);
  crChar := chr(13);
  show := false;
  for i := 0 to 6 do
    begin
      gv.ints[i] := 0;
      gv.strs[i] := '';
    end;
  if passedStr <> '' then
    SetStartParams(passedStr);
  gv.textPtr := CharsPtr(sh^^.textHandle^);
  gv.charCount := GetHandleSize(sh^^.textHandle);
  FindLabels;
  gv.offset := 0;
  repeat
    gv.errStr := '';
```

```
cmdStart := gv.offset;
newLine := true;
ExtractParams;
case FindCmd(params) of
  cNo, cLabel:
    ;
  cRem:
    gv.errStr := '';    { rem doesn't get any errors. }
  cShow:
    show := not show;
  cIf:
    if params[1].int <> 0 then
      begin
        gv.offset := params[2].pos;
        newLine := false;
      end;
  cGoTo:
    begin
      lowcase(params[2].str);
      for i := 1 to numOfLabels do
        if labels[i].name = params[2].str then
          gv.offset := labels[i].offset;
    end;
  cExecute:
    ExecuteAnother;
  cCalib:
    doVerb(calibDM, DMRecsPtr^[params[1].int]);
  cCalibHalf:
    begin
      AcquireRefresh;
      AcquireRefresh;
      DMverbMod := params[2].int;
      doVerb(calibPartDM, DMRecsPtr^[params[1].int])
    end;
  cAssign:
    with params[2] do
      Assign(params[1], int, str, tok);
  cShowtext:
    if params[1].int = 0 then
      doText(true, params[2].str)
    else
      doOKCancel(params[2].str);
  cWriteText:
    doWriteText(params[1].str);
  cCloseText:
    scCloseText;
  cHidetext:
    doText(false, '');
  cPrompt:
    begin
      str := params[2].str;
      if not GetStrings(params[3].str, '', str, params[4].str) then
        gv.errStr := 'Aborted by user'
```

```
      else
        Assign(params[1], 0, str, litStr);
    end;
  cSetEdpt:
    SetEditPt(params[1].str);
  cTCut:
    executeMenu(EditMenu, 3);
  cTCopy:
    executeMenu(EditMenu, 4);
  cTPaste:
    executeMenu(EditMenu, 5);
  cTClear:
    executeMenu(EditMenu, 6);
  cChangePt:
    doChangePt(params[1].str, params[2].int, params[3].int);
  cGetPt:
    doGetPt(params[1], params[2].str, params[3].int);
  cOpen:
    doOpen(params[1].str, params[2].str);
  cSetVol:
    doSetVol(params[1].str);
  cMenu:
    tryMenu(params[1], params[2].str);
  cMCheck:
    doMenuCheck(params[1], params[2], params[3].str);
  cSetItemMark:
    doSetItemMark(params[1], params[2].str, params[3]);
  cMenuOn:
    doMenuOn(params[1], params[2], params[3].str);
  cPostKeys:
    PostKeys(params[1].str);
  cAnnounce:
    announce(params[1].str);
  cNewDM:
    if not NewDM(params[1].str, params[2].str) then
      gv.errStr := 'NewDM didn''t work.';
  cOutDM:
    if not SetDMIO(false, params[1].str, params[3].str, frmTree, params[2].int, params[4].int) then
      gv.errStr := 'hookupOutput didn''t work.';
  cInDM:
    doHookIn(params);
  cGetInDM:
    doGetInDM(params);
  cGetOutDM:
    doGetOutDM(params);
  cSetDMState:
    begin
      i := FindDM(params[1].str, true);
      if i >= 0 then
        DM_OnOff(DMRecsPtr^[i], (params[2].int <> 0));
    end;
  cGetDMState:
    begin
```

-000292

```
        i := FindDM(params[2].str, true);
        if DMRecsPtr^[i].state = on then
          params[2].int := 1
        else
          params[2].int := 0;
        with params[2] do
          Assign(params[1], int, str, litInt);
      end;
    cRefresh:
      AcquireRefresh;
    cAcquire:
      DataAcquisition;
    cWait:
      begin
        t := TickCount + params[1].int;
        repeat
        until t < TickCount;
      end;
  end;    { cmd case }
  if gv.errStr = '' then
    if not turnkey and GetNextEvent(keyDownMask, event) then
      if bitAnd(event.modifiers, cmdKey) <> 0 then
        if bitAnd(event.message, $FF) = ord('.') then
          gv.errStr := 'Aborted by user.';
  if not turnkey or (pos('user', gv.errStr) = 0) then
    begin    { Only show script errors if not turnkey or not user abort. }
      if show or (gv.errStr <> '') then
        begin
          str := '>';
          for i := cmdStart to gv.offset - 1 do
            str := concat(str, gv.textPtr^[i]);
          announce(str);
        end;
      if gv.errStr <> '' then
        begin
          sysbeep(3);
          announce(concat('Script: ', gv.errStr));
        end;
    end;
  if newLine then
    begin
      repeat                         { run out until you find a return }
      until ExtractSym(last) = cr;
      gv.offset := gv.offset + 1;          { inc past the return }
    end;
 until (gv.offset >= gv.charCount) or (gv.errStr <> '');    { if not at end of text, get next command. }
 ExecuteScript := (gv.errStr = '');
 HUnlock(sh^^.textHandle);
end;    { ExecuteScript }

end.
```

```
unit FastStuff;

interface

  var
    processMenu_Addr: Ptr;

{--------------------------------}
{ interface to 68000 routines in FastStuff.a }
  function maxOf (i1, i2: integer): integer; { Return max of two integers }
  function minOf (i1, i2: integer): integer; { Return min of two integers }
  function MinMaxOf (i1, i2, i3: integer): integer; { Returns i2 where i1 < i2 < i3 }
  function AHexWord (word: integer): string;
  procedure ZeroMem (start: Ptr; length: LongInt);
  procedure SwapBytes (startAddr: Ptr; pairs: integer);
  procedure UnionPoints (var r: Rect; p1, p2: Point);
  procedure ReadCompletion;     { This is an IOcompletion routine that expects a paramBlock in A0 }

  function AngleProc (sin, cos: LongInt; TablePtr: Ptr): LongInt; { Given a sine and cosine, return the
       angle. }

{ Interface to faster line drawing routines.  These two work just like quickdraw's }
{ line and lineto.  They use the current grafports (thePort), penloc, penSize (up to }
{ 16x16), and penMode (patCopy, patXor, patOr, patBic), coordinate system }
{ (LocaltoGlobal) and bitmap.  They also clip to either the bitmap or the enclosing }
{ rectangle of the current clipRgn.  They don't use visRgn, penPat (always black), }
{ picSave, rgnSave or polySave. }
  procedure cbLineTo (h, v: integer);
  procedure cbLine (dh, dv: integer);

{--------------------------------}
{ pascal routines }
  function degRange (i: integer): integer;       { Return i in range 0..359 }
  procedure executeMenu (Menu_No, Item_No: integer);

{$ifc Profile_On }
  function hLong (i: integer): longInt;

{ Fast high word of a longInt to integer }
  function hWord (l: longInt): integer;

{ Fast round Fixed point to integer }
  function fRound (f: Fixed): integer;

{ Fast long low to integer }
  function lWord (l: longInt): integer;

{ logical shift left of an integer }
  function lslW (value: integer; shift: integer): integer;

{ logical shift left of a longInt }
  function lslL (value: longInt; shift: integer): longInt;
```

```
{ logical shift right of a longInt }
  function lsrL (value: longInt; shift: integer): longInt;

{$elsec }

{---------------------------------}
{ inline 68000 routines callable as procedures from pascal. }
{ Fast integer to high word of a longInt }
  function hLong (i: integer): longInt;
  inline
    $7000,   { moveq  #0,d0     }
    $301F,   { move.w (a7)+,d0  }
    $4840,   { swap   d0        }
    $2E80;   { move.l d0,(a7)   }

{ Fast high word of a longInt to integer }
  function hWord (l: longInt): integer;
  inline
    $201F,   { move.l (a7)+,d0  }
    $4840,   { swap   d0        }
    $3E80;   { move.w d0,(a7)   }

{ Fast round Fixed point to integer }
  function fRound (f: Fixed): integer;
  inline
    $203C, $0000, $8000, { move.l  #$8000,d0  }
    $D09F,               { add.l   (a7)+,d0   }
    $4840,               { swap    d0         }
    $3E80;               { move.w  d0,(a7)    }

{ Fast long low to integer }
  function lWord (l: longInt): integer;
  inline
    $201F,   { move.l (a7)+,d0  }
    $3E80;   { move.w d0,(a7)   }

{ logical shift left of an integer }
  function lslW (value: integer; shift: integer): integer;
  inline
    $301F,   { move.w (a7)+,d0  }
    $321F,   { move.w (a7)+,d1  }
    $E169,   { lsl.w  d0,d1     }
    $3E81;   { move.w d1,(a7)   }

{ logical shift left of a longInt }
  function lslL (value: longInt; shift: integer): longInt;
  inline
    $301F,   { move.w (a7)+,d0  }
    $221F,   { move.l (a7)+,d1  }
    $E1A9,   { lsl.l  d0,d1     }
    $2E81;   { move.l d1,(a7)   }

{ logical shift right of a longInt }
```

```
function lsrL (value: longInt; shift: integer): longInt;
inline
  $301F,   { move.w  (a7)+,d0  }
  $221F,   { move.l  (a7)+,d1  }
  $E0A9,   { lsr.l   d0,d1     }
  $2E81;   { move.l  d1,(a7)   }

{$endc }

procedure call (procAddr: Ptr);
inline
  $205F,   { move.l  (a7)+,a0  }
  $4E90;   { jsr     (a0)      }

implementation

function minOf;
external;
function maxOf;
external;
function MinMaxOf;
external;
function AHexWord; { (word : integer) : string }
External;
procedure ZeroMem; { (start : Ptr; length : LongInt) }
external;
procedure SwapBytes; { ( startAddr : Ptr;pairs : integer) }
external;
procedure UnionPoints;
external;
procedure ReadCompletion;    { This is an IOcompletion routine that expects a paramBlock in A0 }
external;
function AngleProc (sin, cos: LongInt; TablePtr: Ptr): LongInt; { Given a sine and cosine, return the
     angle. }
external;

procedure cbLineTo;
EXTERNAL;
procedure cbLine;
EXTERNAL;


function degRange; { (i : integer) : integer }
begin
  if (i >= 0) and (i < 3600) then
    degRange := i
  else
    begin
      i := i mod 3600;
      if i < 0 then
        degRange := i + 3600
      else
        degRange := i;
```

```
    end;
  end;

  procedure callMenu (h, l: integer; procAddr: Ptr);
  inline
    $205F,   { move.l  (a7)+,a0  }
    $4E90;   { jsr     (a0)      }
  procedure executeMenu; { (Menu_No, Item_No : integer)}
{ Execute the given item number for the given menu.  This assumes that the }
{ global ptr ProccessMenu_Addr already points to the menu handler routine }
{ called 'ProccessMenu_In' in DataSuit.pas. }
  begin
    callMenu(Item_No, Menu_No, ProcessMenu_Addr);
  end;

{$ifc Profile_On }
  function hLong; { (i: integer): longInt }
  begin
    hLong := BitShift(i, 8);
  end;

 { Fast high word of a longInt to integer }
  function hWord; { (l: longInt): integer }
  begin
    hWord := HiWord(l);
  end;

 { Fast round Fixed point to integer }
  function fRound; { (f: Fixed): integer }
  begin
    fRound := FixRound(f);
  end;

 { Fast long low to integer }
  function lWord; { (l: longInt): integer }
  begin
    lWord := loWord(l);
  end;

 { logical shift left of an integer }
  function lslW; { (value: integer; shift: integer): integer }
  begin
    lslW := BitShift(value, shift);
  end;

 { logical shift left of a longInt }
  function lslL; { (value: longInt; shift: integer): longInt }
  begin
    lslL := BitShift(value, shift);
  end;

 { logical shift right of a longInt }
  function lsrL; { (value: longInt; shift: integer): longInt }
```

```
  begin
    lsrL := BitShift(value, -shift);
  end;
{$endc }
end.
```

```
unit FileIO;

interface
  uses
    ChuckStuff, AutoLib, Globals, Tree3DGlob, Tree3D, {}
    DMTypes, DMGlobals, MiscRoutines, DataAqUnit, Flex, DMFileIO, DataMassage, Swivel_Stuff,
        ScriptGlob;

  procedure SetFileMenus;
  procedure SetCrnt (vRefNum: integer; fName: str255; ft: fileType);
  procedure InitFileIO;
  function OpenFile (vRef: integer; Name: str255; ft: FileType): integer;
  procedure doFileMenu (item_no: integer);
  procedure doFileQuit;
  function CloseFileIO: boolean;

implementation

  const
    NewItem = 1;                          {  New          }
                                          {  {  -------      }
    OpenTItem = 3;                        {  Open Tree    }
    SaveTItem = 4;                        {  Save Tree    }
    SaveAsTItem = 5;                      {  Save Tree As }
    RevertTItem = 6;                      {  Revert Tree  }
                                          {  {  -------      }
    OpenDItem = 8;                        {  Open DM      }
    SaveDItem = 9;                        {  Save DM      }
    SaveAsDItem = 10;                     {  Save DM As   }
    RevertDItem = 11;                     {  Revert DM    }
    IncludeDItem = 12;                    {  Include DM file... }
    OpenBothItem = 13;                    {  Open Tree and DM }
                                          {  {  -------      }
    PageSetUpItem = 15;                   {  Page Setup   }
    PrintDItem = 16;                      {  Print Flex Window }
                                          {  {  -------      }
    ReadSwivItem = 18;                    {  Import Swivel Tree     }
    SwivAndDMItem = 19;                   {  Open Swivel and DM }
    WriteSwivItem = 20;                   {  Export Text File       }
    SwivScriptItem = 21;                  {  Write Swivel Script }
                                          {  {  -------      }
    QuitItem = 23;                        {  Quit         }

  type
      { TextOutType is the list of types of text files BE can generate. }
    TextOutType = (SwivBuild, SwivSet, ActaTab, FullTreeDesc, DMDesc, TextOutEnd);

  var
    FileTypeName: array[fileType] of OSType;
    TextOut: TextOutType;                            { Current Text Output type. }

  procedure SetFileMenus;
  begin
```

-000299

```
  EnDisItem(FileMHndl, SaveTItem, FileDirty[treeFile]);
  EnDisItem(FileMHndl, SaveDItem, FileDirty[dmFile]);
 end;

 function myMenuSelect (startpt: Point): LongInt;
  function callMS (pt: Point; procAddr: LongInt): LongInt;
  inline
    $205F, { move.l  (a7)+,a0  }
    $4E90; { jsr     (a0)      }

 begin
  SetFileMenus;
 end;

 procedure SetCrnt (vRefNum: integer; fName: str255; ft: fileType);
{ Set the current global filename and volume reference number. }
{ SetCrnt is declared external in Swivel_Stuff so if the parameters are changed they also have to be changed
      there. }
  var
   str: Str255;
 begin
  FileDirty[ft] := false;
  crntvRef[ft] := vRefNum;
  crntfName[ft] := fName;
  if crntfName[treeFile] = '' then
   SetWTitle(mainTreePtr^.wp, 'Untitled')
  else
   SetWTitle(mainTreePtr^.wp, crntfName[treeFile]);
  SetItem(FileMHndl, SaveTItem, concat('Save ', crntfName[treeFile]));
  SetItem(FileMHndl, SaveDItem, concat('Save ', crntfName[dmFile]));
  EnDisItem(FileMHndl, SaveTItem, crntfName[treeFile] <> '');
  EnDisItem(FileMHndl, SaveDItem, crntfName[dmFile] <> '');
  EnDisItem(FileMHndl, RevertTItem, crntfName[treeFile] <> '');
  EnDisItem(FileMHndl, RevertDItem, crntfName[dmFile] <> '');
 end;

 function AsktoSave (fType: FileType; str: string; var noCancel: boolean): boolean;
  var
   sowhat: boolean;
  var
   i: integer;
 begin
  AsktoSave := false;
  if crntfName[fType] <> '' then
   begin
    str := concat('Save changes to the ', str, ' file "', crntfName[fType], '"?');
    ParamText(str, '', '', '');
    i := CautionAlert(YesNoID, nil);
    case i of
     3:   { Cancel }
      noCancel := false;
     2:
      ;   { No }
```

-000300

```
      1:   { yes }
        begin
          AsktoSave := true;
        end;
      end;  { case }
    end;{ with, if there is a filename }
  end;{ AsktoSave }

  procedure NewFile (ft: FileType);
    var
      i: integer;
  begin
    if ft = treeFile then
      begin
        NewTree(mainTreePtr);
        DeleteAllScripts(treeRad);
        HookupFlag := true;  { Signal that DM's need to be rehooked up. }
      end
    else
      begin
        DeleteAllDMs;
        DeleteAllScripts(DMRad);
        DMAliases(applRes, true, true);
      end;
    SetCrnt(0, '', ft);
  end;

  procedure GetSaveScript (vRef: integer; fName: string; getS, purgeFirst: boolean; ft: FileType);
    { The given file is being opened or closed.  Get or save any scripts associated with the file. }
    { getS is true if get.  If purgeFirst is true then before the get purge any scripts already existing. }
    { Get or save scripts from the given file. }
    var
      ResNum, err, oldVref, i: integer;
      inFile: inFileType;
      message: longInt;
  begin
    err := GetVol(nil, oldVref);
    err := SetVol(nil, vRef);
    if err = noErr then
      begin
        ResNum := OpenResFile(fName);
        if ResNum < 0 then
          err := ResError
        else
          begin
            if ft = treeFile then
              begin
                infile := treeRad;
                message := TreeStartBit;
              end
            else
              begin
                infile := DMRad;
```

```
            message := DMStartBit;
          end;
        if getS then
          begin
            AddAllScripts(infile, purgeFirst);
            if purgeFirst then
              err := PostEvent(app1Evt, message + ExStartupMsg);
          end
        else
          SaveAllScripts(inFile);
        if inFile = DMRad then         { Also get/clear aliases attached to the DM files. }
          DMAliases(ResNum, getS, purgeFirst);
        CloseResFile(ResNum);
      end;
    end;
  err := SetVol(nil, oldVref);
end;{ GetSaveSript }

function OpenFile; { (vRef : integer; Name : str255; ft : FileType) : integer }
  var
    i, j, oldVol, oldResFile: integer;
begin
  begin
    case ft of
      treeFile:
        begin
          i := GetTree(mainTreePtr, vRef, Name);
          if i = noErr then
            IsaacFName := ExFileName(Name, 'isaac');
          HookupFlag := true;  { Signal that DM's need to be rehooked up. }
        end;
      dmFile:
        begin
          i := OpenDMs(vRef, Name, false);
          ReOrderDMIO;
        end;
    end;
    FlexRedo(false);
    if i = noErr then
      begin
        SetCrnt(vRef, Name, ft);
        fileDirty[ft] := false;        { get, purge }
        GetSaveScript(vRef, Name, true, true, ft);
      end
    else
      begin
        NewFile(ft);
        AnnounceB(stringof('OpenFile error #', i : 1, ' on "', Name, '".'));
      end;
  end;
  OpenFile := i;
end;
```

```
function SaveFile (vRef: integer; Name: string; ft: FileType): integer;
  var
    i, eh: integer;
begin
  case ft of
    treeFile:
      i := PutTree(mainTreePtr, vRef, Name);
    dmFile:
      i := SaveDMs(vRef, Name);
  end;
  if i = 0 then
    begin
      SetCrnt(vRef, Name, ft);
      FileDirty[ft] := false;      { save, purge }
      GetSaveScript(vRef, Name, false, true, ft);
      eh := FlushVol(nil, vRef);
    end
  else
    Announce(stringof('Put error: ', i));
  SaveFile := i;
end;

function SaveAsMenu (ft: fileType): Boolean;
      { Return true if the user chose a file. }
  var
    i, vRef: integer;
    str, str2: str255;
begin
  if crntfName[ft] <> '' then
    str2 := crntfName[ft]
  else if ft = treeFile then
    str2 := 'Untitled.Tree'
  else if ft = dmFile then
    str2 := 'Untitled.DM'
  else
    str2 := '';
  NewFileIdent(str, vRef, str2, 'Save as?');
  if str <> '' then
    begin
      if ft = treeFile then
        IsaacFName := ExFileName(str, 'isaac');
      SaveAsMenu := (SaveFile(vRef, str, ft) = noErr);
    end
  else
    SaveAsMenu := false;
end;    { SaveAsMenu }

procedure SaveMenu (ft: fileType);
  var
    i: integer;
    b: Boolean;
begin
  if crntfName[ft] = '' then
```

```
    b := SaveAsMenu(ft)
  else
    i := SaveFile(crntvRef[ft], crntfName[ft], ft);
end;    { SaveMenu }

function OpenMenu (ft: fileType): boolean;
  var
    Name: str255;
    i, vRef: integer;
    prompt: str255;
    Tnum: integer;
    TList: SFTypeList;
    noCancel: boolean;
begin
  OpenMenu := false;
  TList[0] := FileTypeName[ft];
  if ft = treeFile then
    prompt := 'Tree'
  else
    prompt := 'Data Massage';
  noCancel := true;
  if FileDirty[ft] then
    if AsktoSave(ft, prompt, noCancel) then
      SaveMenu(ft);
  if noCancel then
    begin
      prompt := concat(prompt, ' file to open?');
      OldFileIdent(Name, vRef, prompt, 1, TList);
      if Name <> '' then
        if OpenFile(vRef, Name, ft) = noErr then
          begin
            if ft = treeFile then
              begin
              {•      TreeWindow(mainTreePtr, true);•}
                i := postevent(app1Evt, 4);   { should be LoadedTreeMsg }
              end;
            OpenMenu := true;
          end;
    end;
end;    { OpenMenu }

procedure OpenBothMenu (doTree: Boolean);
  { Open a tree and a DM with the name <treename>.DM.  If doTree is true then ask the user for a }
  { BE .Tree file.  If it is false then ask the user for a Swivel file. }
  var
    FndrInfo: FInfo;
    err: integer;
    dmName: string;
    b: Boolean;
begin
  if doTree then
    b := OpenMenu(treeFile)
  else
```

```
    b := Import_Swivel = noErr;
   if b then
    if crntfName[treeFile] <> '' then
     begin
      dmName := concat(crntfName[treeFile], 'DM');              { Try to open <treename>DM }
      err := GetFInfo(dmName, crntvref[treeFile], FndrInfo);
      if err <> noErr then
       begin                                  { If that failed then try }
        dmName := ExFileName(crntfName[treeFile], 'DM');         { to open <treebase>.DM }
        err := GetFInfo(dmName, crntvref[treeFile], FndrInfo);
       end;
      if err = noErr then
       if FndrInfo.fdType = FileTypeName[dmFile] then
        begin
         err := OpenFile(crntvref[treeFile], dmName, dmFile);
        end;
      if err <> 0 then
       if err = fnfErr then
        AnnounceB(StringOf('Couldn''t find a Data Massage file to go along with ''', crntfName[treeFile],
      '''.'))
       else
        AnnounceB(StringOf('Couldn''t open the Data Massage file.  Err: ', err : 1));
     end;
  end;

  procedure RevertMenu (ft: fileType);
   var
    i: integer;
  begin
   if crntfName[ft] <> '' then
    i := OpenFile(crntvRef[ft], crntfName[ft], ft);
  end;    { RevertMenu }

  procedure IncludeDMMenu;
{ include DM file.. }
   var
    Name: str255;
    i, vRef: integer;
    Tnum: integer;
    TList: SFTypeList;
  begin
   TList[0] := FileTypeName[dmFile];
   OldFileIdent2(Name, vRef, 'Include which DM file?', 1, TList);
   if Name <> '' then
    begin
     i := OpenDMs(vRef, Name, true);
     ReOrderDMIO;
     if i <> 0 then
      Announce(stringof('Include error: ', i))
     else
      begin
       FileDirty[dmFile] := true;   { get, no purge }
       GetSaveScript(vRef, Name, true, false, dmFile);
```

```
      end;
    FlexRedo(true);
    end;
  end;    { IncludeDMMenu }

{ The user chose 'New' from the file menu. }
  procedure NewMenu;
    var
      noCancel: boolean;
  begin
    noCancel := true;
    if FileDirty[treeFile] then
      if AsktoSave(treeFile, 'tree', noCancel) then
        SaveMenu(treeFile);
    if noCancel then
      if FileDirty[dmFile] then
        if AsktoSave(dmFile, 'Data Massage', noCancel) then
          SaveMenu(dmFile);
    if noCancel then
      begin
        NewFile(treeFile);
        NewFile(dmFile);
        TreeWindow(mainTreePtr, true);
      end;
  end;    { NewMenu }

  procedure WriteTextOut;
    { Write out a text file.  TextOut has the type of file to write. }
    var
      err, vRef, oldRefNum: integer;
      name: Str255;
      prompt: string;
      out: Text;
  begin
    case TextOut of
      SwivBuild:
        begin
          name := ExFileName(CrntfName[treeFile], 'SwivBuild');
          prompt := 'Save Swivel Build as?';
        end;
      SwivSet:
        begin
          name := ExFileName(CrntfName[treeFile], 'SetSwiv');
          prompt := 'Save Set Swivel as?';
        end;
      ActaTab:
        begin
          name := ExFileName(CrntfName[treeFile], 'tabs');
          prompt := 'Save tabbed Tree as?';
        end;
      FullTreeDesc:
        begin
          name := ExFileName(CrntfName[treeFile], 'Trdesc');
```

```
      prompt := 'Save Tree description as?';
    end;
  DMDesc:
    begin
      name := ExFileName(CrntfName[DMFile], 'DMdesc');
      prompt := 'Save DM description as?';
    end;
end;
NewFileIdent(name, vRef, name, prompt);
if name = '' then
  exit(WriteTextOut);
err := GetVol(nil, oldRefNum);
err := SetVol(nil, vRef);
ReWrite(out, name);
err := SetVol(nil, oldRefNum);
case TextOut of
  SwivBuild:
    WriteSwivelTree(out, CrntfName[treeFile], false);
  SwivSet:
    WriteSwivelTree(out, CrntfName[treeFile], true);
  ActaTab:
    TreePrint(out, mainTreePtr, CrntfName[treeFile], true);
  FullTreeDesc:
    TreePrint(out, mainTreePtr, CrntfName[treeFile], false);
  DMDesc:
    if OptionIsDown then
      DescribeDMTypes(out)
    else
      DescribeDMs(out, CrntfName[DMFile]);
  end;
  Close(out);
end;

procedure TextOutMenu;
 { User has selected File, 'Text Output'. Put up a dialog box asking which flavor of text to output. }
 const
   TextOutID = 2026;
   NameEdItem = 1;
   FirstSelItem = 4;
   LastSelItem = FirstSelItem + ord(pred(TextOutEnd));
   doAllItem = 8;
   doCheckedItem = 9;
 var
   i, itemHit: integer;
   dlogPtr: DialogPtr;
   newType: TextOutType;
   newMatch: Boolean;
   str: Str255;
begin
  dlogPtr := GetNewDialog(TextOutID, nil, Pointer(-1));
  PositionWindow(dlogPtr, 50, 10);
  newType := TextOut;
  RadioRange(dlogPtr, FirstSelItem, ord(TextOutEnd), ord(newType));
```

```
  ShowWindow(dlogPtr);
  repeat
    ModalDialog(nil, itemHit);
    case itemHit of
      FirstSelItem..LastSelItem:
        begin
          newType := TextOutType(itemHit - FirstSelItem);
          RadioRange(dlogPtr, FirstSelItem, ord(TextOutEnd), ord(newType));
        end;
      otherwise
        ;
    end;
  until itemHit <= 2; { Until OK or Cancel is clicked. }
  if itemHit = 1 then
    begin { OK clicked. }
      TextOut := newType;
      WriteTextOut;
    end;
  DisposDialog(dlogPtr);
end;

procedure doFileMenu; { (item_no : integer) }
  var
    b: boolean;
    err: integer;
begin
  case Item_No of
    NewItem:
      NewMenu;
    OpenTItem:
      b := OpenMenu(treeFile);
    SaveTItem:
      SaveMenu(treeFile);
    SaveAsTItem:
      b := SaveAsMenu(treeFile);
    RevertTItem:
      RevertMenu(treeFile);
    OpenDItem:
      b := OpenMenu(dmFile);
    SaveDItem:
      SaveMenu(dmFile);
    SaveAsDItem:
      b := SaveAsMenu(dmFile);
    RevertDItem:
      RevertMenu(dmFile);
    IncludeDItem:
      IncludeDMMenu;
    PrintDItem:
      PrintFlex;
    OpenBothItem:
      OpenBothMenu(true);
    PageSetUpItem:
      PrintStyle;
```

```
      ReadSwivItem:
        err := Import_Swivel;
      SwivAndDMItem:
        OpenBothMenu(false);
      WriteSwivItem:
        TextOutMenu;
      SwivScriptItem:
        menuSwivel(-1);
      QuitItem:
        Finished := True;          {quit}
    end; { case }
  end;
  procedure doFileQuit;
  begin
    doFileMenu(QuitItem);
  end;

  procedure InitFileIO;
    procedure LoadFinderFiles;
    { load off of files that were selected from the finder.  This first loads the first }
    { tree file, then the first dm file. }
      var
        count, mess: integer;
        theFile: AppFile;
        treeFound, dmFound: boolean;
        ft: Filetype;
      procedure LoadFileOf (ft: fileType);
        { Load the first file of type ft. }
        var
          i, err: integer;
          found: boolean;
      begin
        found := false;
        i := 0;
        repeat
          i := i + 1;
          GetAppFiles(i, theFile);
          if theFile.fType = FileTypeName[ft] then
            with theFile do
              begin
{*        announce(stringof('LoadFileOf: trying to load ', fName));*}
                err := OpenFile(vRefNum, fName, ft);
                found := (err = 0);
                if found then
                  SetCrnt(vRefNum, fName, ft);
              end;
        until (i = count) or found; { until no more finder files or ft file found. }
      end;     { LoadFileOf }

    begin
      CountAppFiles(mess, count);
      if (count <> 0) and (mess <> 1) then
        begin     { If this was passed any files then try to open the first tree & DM. }
```

```
{•     announce(stringof('LoadFinderFiles: count = ', count));•}
        LoadFileOf(treeFile);   { Open the first tree }
        LoadFileOf(dmFile);     { Open the first DM. }
      end;
    end;

  begin
    FileTypeName[treeFile] := TreeFileType;
    FileTypeName[dmFile] := DMFileType;
    crntFName[treefile] := '';
    crntFName[dmFile] := '';
    SetCrnt(0, '', treeFile);
    SetCrnt(0, '', dmFile);
    FileDirty[treeFile] := false;
    FileDirty[dmFile] := false;
    TextOut := SwivBuild;
    if not turnkey then
      LoadFinderFiles;
  end;

  function CloseFileIO;
    var
      ft: FileType;
      i, j: integer;
      str: Str255;
      noCancel: boolean;

  begin
    noCancel := true;
    if FileDirty[treeFile] then
      if turnKey then
        SaveMenu(treeFile)
      else
        begin
          if crntfName[treeFile] = '' then
            crntfName[treeFile] := 'Untitled.Tree';
          if AsktoSave(treeFile, 'tree', noCancel) then
            if crntfName[treeFile] = 'Untitled.Tree' then
              noCancel := SaveAsMenu(treeFile)
            else
              SaveMenu(treeFile);
        end;
    if noCancel then
      if FileDirty[dmFile] then
        if turnkey then
          SaveMenu(dmFile)
        else
          begin
            if crntfName[dmFile] = '' then
              crntfName[dmFile] := 'Untitled.DM';
            if AsktoSave(dmFile, 'Data Massage', noCancel) then
              if crntfName[dmFile] = 'Untitled.DM' then
                noCancel := SaveAsMenu(dmFile)
```

```
            else
              SaveMenu(dmFile);
          end;
    CloseFileIO := noCancel;
  end;

end.
```

-000311

```
{ Test out my DM data typing with some simple dm's that used Fixed Data types. }

unit FixedDMs;
interface
  uses
    FixMath, ChuckStuff, scottsStuff, AutoLib, Globals, Tree3DGlob, {}
    FastStuff, MiscRoutines, Tree3D, formTree3D, DMTypes, DMGlobals, SomeDMs;

  procedure doScaleFix (var dm: DMRec);
  procedure HandleScaleFix (v: DMVerb; var dm: DMRec);

  procedure doInttoFix (var dm: DMRec);
  procedure doFixtoInt (var dm: DMRec);

  procedure doTypeCast (var dm: DMRec);

implementation

  type
    { Private storage for a fixed Scale/Offset DM. }
    ScalePvtType = record
        scaleby: Fixed;
        offsetby: Fixed;
      end;
    ScalePvtPtr = ^ScalePvtType;

  procedure doScaleFix; { (var dm : DMRec) }
    var
      i: integer;
      r: real;
      sptr: ScalePvtPtr;
  begin
    sptr := ScalePvtPtr(@dm.PrivateWords);
    for i := 0 to dm.inputs - 1 do
      with dm, dm.PointsOut[i] do
        begin
          LastValue.f := FixMul(SlotsIn[i].ptrfrm^.f, sptr^.scaleby) + sptr^.offsetby;
          if ptrto <> nil then
            SetSixth(ptrto, ord(SixAxis), HiWord(LastValue.f + $8000));
        end;
  end;

{ HandleScaleFix has all the routines nessessary to pass data from the rawData array }
{ to a point in the tree after scaling and offseting them. }
  procedure HandleScaleFix (v: DMVerb; var dm: DMRec);

    var
      i: integer;
      h: handle;
      sptr: ScalePvtPtr;

    procedure Calibrate (var dm: DMRec);
```

```
  var { calibrate this Scale/Offset dm. }
    sptr: ScalePvtPtr;
    prompt1, str1, str2: str255;
    r: extended;
  begin
   sptr := ScalePvtPtr(@dm.PrivateWords);
   prompt1 := concat('Fixed Scale/Offset DM module "', dm.name, '".');
   prompt1 := concat(prompt1, chr(13), 'Enter the new scale value:');
   str1 := StringOf(Fix2X(sptr^.scaleby) : 5 : 5);
   str2 := StringOf(Fix2X(sptr^.offsetby) : 5 : 5);
   if GetStrings(prompt1, 'And the new offset value:', str1, str2) then
     begin
      if str1 <> '' then
        begin
         r := StringtoReal(str1);
         sptr^.scaleby := X2Fix(r);
        end;
      if str2 <> '' then
        begin
         r := StringtoReal(str2);
         sptr^.offsetby := X2Fix(r);
        end;
      FileDirty[dmFile] := true;
     end;
  end;

begin
 case v of
  initDM:          { Called once the first time this DM is started. }
    begin
     if dm.private <> nil then
       doClose(dm);
     sptr := ScalePvtPtr(@dm.PrivateWords);
     sptr^.scaleby := hLong(1);
     sptr^.offsetby := 0;
     Calibrate(dm);
    end;
  massageDM:       { Called once through the main loop. do a massage }
    doScale(dm);
  closeDM:         { Called when this module is deleted. Do whatever... }
    doClose(dm);
  reHookedDM:
    ;              { DM has been re-hooked up. who cares? }
  fopenDM:         { This DM has just been read from a file. If it's state is }
                   { on it was hooked up properly. private points to the }
    begin          { private memory it had when saved. }
    end;
  fsaveDM:         { This DM is about to be saved to a file. Do any changes }
    begin          { nessessary to private memory so it can be restored later. }
    end;
  calibDM:         { Calibrate the DM module. }
    begin
     Calibrate(dm);
```

```
      end;
    describeDM:         { put a description into describeStr }
      begin
        sptr := ScalePvtPtr(@dm.PrivateWords);
        describeStr := StringOf('Scale: ', Fix2X(sptr^.scaleby) : 5 : 5);
        describeStr := StringOf(describeStr, ', Offset: ', Fix2X(sptr^.offsetby) : 5 : 5);
      end;
    writeCodeDM:
      begin
        sptr := ScalePvtPtr(@dm.PrivateWords);
        if true then
          for i := 0 to dm.inputs - 1 do
            begin
              if sptr^.scaleby >= 0 then
                Add_Word($7000)                     {moveq #0,d0}
              else
                Add_Word($70FF);                    {moveq #-1,d0}
              Add_Word($223C);                        {move.l #scaleby,d1}
              Add_Addr(Pointer(sptr^.scaleby));
              Add_Word($4c39);                        {muls.l <frmaddr>, d1:d0}
              Add_Word($1c00);
              Add_Addr(Pointer(dm.SlotsIn[i].ptrfrm));
              Add_Word($4841);                        {swap d1}
              Add_Word($4840);                        {swap d0}
              Add_Word($3001);                        {move.w d1,d0}
              Add_Word($D0BC);                        {add.l #offset,d0}
              Add_Addr(Pointer(sptr^.offsetby));
              Add_D0toLastValue(dm.PointsOut[i]);   { save result }
            end;
      end;
    otherwise          { Should be no other. }
      sysbeep(3);
  end;        { case }
end;          { HandleScaleFix }


procedure doInttoFix; { (var dm : DMRec) }
  var
    i: integer;
begin
  for i := 0 to dm.inputs - 1 do
    with dm, dm.PointsOut[i] do
      begin
        LastValue.f := BitShift(SlotsIn[i].ptrfrm^.i, 16);
        if ptrto <> nil then
          SetSixth(ptrto, ord(SixAxis), HiWord(LastValue.f + $08000));
      end;
end;

procedure doFixtoInt; { (var dm : DMRec) }
  var
    i: integer;
begin
```

```
  for i := 0 to dm.inputs - 1 do
    with dm, dm.PointsOut[i] do
      begin
        LastValue.i := HiWord(SlotsIn[i].ptrfrm^.f + $08000);
        if ptrto <> nil then
          SetSixth(ptrto, ord(SixAxis), LastValue.i);
      end;
end;

  { This is a general purpose DM to translate numbers.  It translates from int <-> long <-> fixed <-> real. }
procedure doTypeCast (var dm: DMRec);
  var
    i: integer;
begin
  for i := 0 to dm.inputs - 1 do
    with dm, dm.PointsOut[i] do
      begin
        case outType of
          intD:
            begin
              case dm.SlotsIn[i].inType of
                intD:
                  lastvalue.i := dm.SlotsIn[i].ptrfrm^.i;
                longD:
                  lastvalue.i := dm.SlotsIn[i].ptrfrm^.l;
                fixedD:
                  lastvalue.i := hiWord(dm.SlotsIn[i].ptrfrm^.f + $08000);
                realD:
                  lastvalue.i := round(dm.SlotsIn[i].ptrfrm^.r);
              end;      { case }
              if ptrto <> nil then
                SetSixth(ptrto, ord(SixAxis), LastValue.i);
            end;
          longD:
            begin
              case dm.SlotsIn[i].inType of
                intD:
                  lastvalue.l := dm.SlotsIn[i].ptrfrm^.i;
                longD:
                  lastvalue.l := dm.SlotsIn[i].ptrfrm^.l;
                fixedD:
                  lastvalue.l := Fix2Long(dm.SlotsIn[i].ptrfrm^.f);
                realD:
                  lastvalue.l := round(dm.SlotsIn[i].ptrfrm^.r);
              end;      { case }
              if ptrto <> nil then
                SetSixth(ptrto, ord(SixAxis), LastValue.l);
            end;
          fixedD:
            begin
              case dm.SlotsIn[i].inType of
                intD:
                  lastvalue.f := Long2Fix(dm.SlotsIn[i].ptrfrm^.i);
```

```
            longD:
              lastvalue.f  :=  Long2Fix(dm.SlotsIn[i].ptrfrm^.l);
            fixedD:
              lastvalue.f  :=  dm.SlotsIn[i].ptrfrm^.f;
            realD:
              lastvalue.f  :=  X2Fix(dm.SlotsIn[i].ptrfrm^.r);
          end;      { case }
          if ptrto <> nil then
            SetSixth(ptrto, ord(SixAxis), hiWord(LastValue.f + $08000));
        end;
      realD:
        begin
          case dm.SlotsIn[i].inType of
            intD:
              lastvalue.r  :=  dm.SlotsIn[i].ptrfrm^.i;
            longD:
              lastvalue.r  :=  dm.SlotsIn[i].ptrfrm^.l;
            fixedD:
              lastvalue.r  :=  Fix2X(dm.SlotsIn[i].ptrfrm^.f);
            realD:
              lastvalue.r  :=  dm.SlotsIn[i].ptrfrm^.r;
          end;      { case }
          if ptrto <> nil then
            SetSixth(ptrto, ord(SixAxis), round(LastValue.r));
        end;
    end;    { case }
   end;
 end;

end.
```

```
{ Visual display of DM's.  (Called Flex) }
{ This code supports the Flex window which visually show's what the DM's look}
{ like, how they are hooked up etc. }

{  By Chuck Blanchard,  10/2/88 }
{  Copyright 1988 VPL Research, Inc.  All rights reserved}

unit Flex;

interface

  uses
    PrintTraps, ChuckStuff, FastStuff, AutoLib, Globals, Tree3DGlob,{}
    MiscRoutines, RawUnit, Tree3D, DMTypes, DMGlobals, HandleDMs, DMEdit, FlexDraw;

  const
    RectResType = 'RECT';  { Rectangle resource type. }

  type
    RectPtr = ^Rect;
    RectHandle = ^RectPtr;

  var
    FlexWDyItem: integer;

  procedure CenterSelections;
  procedure DeselectAll;
  procedure SelectThis (flexH: FlexHandle);

  procedure FlexUpdate;
  procedure FlexResize;
  procedure FlexActivate (on: boolean);
  procedure FlexMouse (event: EventRecord);

  procedure UpdateOneFlex (var dm: DMRec);
  procedure FlexDelete (var dm: DMRec; updateFlex: boolean);
  procedure FlexAdd (var dm: DMRec);

  procedure FlexRedo (saveSelected: boolean);
  procedure FlexWindow (on: boolean);
  procedure AddAsPic (h: Handle; r: Rect);
  procedure PictureEdit (item: integer);
  procedure FlexwindMenu (dyItem: integer);
  procedure dotoSelec (procedure doit (var dm: DMRec; flexH: FlexHandle));

  procedure DeletePICTs (res: Integer);
  procedure InitFlex (doAll: boolean);
  procedure CloseFlex;

  procedure PrintStyle;
  procedure PrintFlex;

implementation
```

```
const
  flexWindID = 500;        { ID # of the flex WIND resource. }
var
  lastTick: longInt;
  lastPt: Point;               { last mousedown, used for double-click }
  AddPoint: Point;             { last click on nothing.  Where next DM will be added. }
  ScrollH, ScrollV: ControlHandle;
  scrollMin, scrollMax, scrollStart, scrollPage: integer;
  scrollHorz: boolean;
  Editstart, Editend: integer;    { dyitem bounds for items in the edit menu. }
  popUpNames: Boolean;

procedure SelEdText (dPtr: DialogPtr; Editem: integer);
{ Select the entire text for the ednum'th edit item in the given dialog. }
  var
    ItemH: Handle;
    box: Rect;
    i, j, rtype: Integer;
begin
  i := 0;
  j := 0;
  repeat
    i := i + 1;
    GetDItem(dPtr, i, rtype, ItemH, box);
    If rtype = editText then
  .  j := j + 1;
  until (j = Editem) or (ItemH = nil);
  if ItemH <> nil then
    SelIText(dPtr, i, 0, 32767);
end;

function FlexWindowOn: boolean;
{ Return true if the flex window exists and is on. }
begin
  If FlexWPtr = nil then
    FlexWindowOn := false
  else
    FlexWindowOn := WindowOn(FlexWPtr);
end;

procedure DMsToFlex (saveSelect: boolean);
  { Make a whole new list of Flex records that reflect the current state of }
  { the DM's.  If saveSelect is true then don't clear the selected flags when remaking}
  { the boxes and rebuilt the selected linked-list after the boxes are rebuilt. }
  var
    i, lastsel: integer;
begin
  SelecRoot := nil;
  for i := 0 to numOfDMRec do
    begin
      MakeFlexBox(DMRecsPtr^[i], saveSelect);
    end;
```

```
  if saveSelect then  { Remake the linked-list of selected DM's. }
    for i := 0 to numOfDMRec do
      with DMRecsPtr^[i] do
        if FlexH^^.selected then
          begin
            if SelecRoot = nil then
              SelecRoot := FlexH
            else
              DMRecsPtr^[lastsel].FlexH^^.nextSelH := FlexH;
            lastsel := i;
          end;
  MakeAllLines;
end;

function CalcTotalRect: rect;
  { Calculate the rectangle that encloses all the Flex boxes. }
  var
    i: integer;
    r: Rect;
    p: PicInfoHandle;
begin
  SetRect(totalBound, 0, 0, 0, 0);
  for i := 0 to numOfDMRec do
    if DMRecsPtr^[i].flexH <> nil then
      UnionRect(totalBound, BoundRect(DMRecsPtr^[i].flexH^^), totalBound);
  { Now find the totalRect for all the Pictures. }
  p := PicRoot;
  while p <> nil do
    begin
      UnionRect(totalBound, p^^.bounds, totalBound);
      p := p^^.next;
    end;
  totalBound.top := totalBound.top - 5;
  totalBound.left := totalBound.left - 5;
  CalcTotalRect := totalBound;
end;

procedure AnchorScrollBars;
  { Anchor the scrollbars to the right and bottom edges of the Flex window.  The origin of }
  { the Flex window probably isn't 0,0. }
begin
  if false then
    begin
      SetOrigin(OriginH, OriginV);
      with FlexWPtr^.portRect do
        begin
          MoveControl(ScrollV, right - 15, top - 1);
          MoveControl(ScrollH, left, bottom - 15);
        end;
    end;
end;

procedure SetScrollBars;
```

```
  var
    r: Rect;
    i: integer;
 begin
  r := CalcTotalRect;
  ClipOpen;
  with FlexWPtr^.portRect do
   begin
    if (r.top >= top + OriginV) and (r.bottom <= (bottom - 16) + OriginV) then
     begin
      { There shouldn't be any vert scroll bar. }
      HideControl(ScrollV);
     end
    else
     begin
      HideControl(ScrollV);
      MoveControl(ScrollV, right - 15, top - 1);
      SizeControl(ScrollV, 16, bottom - top - 13);
      SetCtlMin(ScrollV, r.top);
      SetCtlMax(ScrollV, r.bottom - (bottom - top) div 2);
      SetCtlValue(ScrollV, OriginV);
      ShowControl(ScrollV);
     end;
    if (r.left >= left + OriginH) and (r.right <= (right - 16) + OriginH) then
     begin
      { There shouldn't be any horz scroll bar. }
      HideControl(ScrollH);
     end
    else
     begin
      HideControl(ScrollH);
      MoveControl(ScrollH, left, bottom - 15);
      SizeControl(ScrollH, right - left - 13, 16);
      SetCtlMin(ScrollH, r.left);
      SetCtlMax(ScrollH, r.right - (right - left) div 2);
      SetCtlValue(ScrollH, OriginH);
      ShowControl(ScrollH);
     end;
   end;
  ClipBars;
 end;

 function UniqueFlexPICT: integer;
{ Return a unique PICT Id that's between FlexPICTstart and FlexPICTend and doesn't have a PICT resource in
      it. }
  var
    i: integer;
    pic: PicHandle;
 begin
  for i := FlexPICTstart to FlexPICTend do
   begin
    pic := PicHandle(Get1Resource('PICT', i));
    if pic = nil then
```

```
        begin
          UniqueFlexPICT := i;
          leave
        end;
    end;
  end;

  procedure FlexUpdate;
{ Called in response to an update event for the Flex window. }
    var
      i: integer;
      oldPort: GrafPtr;
      oldClip: Region;
      dstRect: Rect;
  begin
    GetPort(oldPort);
    SetPort(FlexWPtr);
    ClipOpen;
    EraseRect(FlexWPtr^.portRect);
    DrawGrowIcon(FlexWPtr);
    if FrontWindow = FlexWPtr then
      DrawControls(FlexWPtr);
    ClipBars;
    BackGround(FlexWPtr^.visRgn^^.rgnBBox, true);
    DrawIn(FlexWPtr^.visRgn^^.rgnBBox);
    SetPort(oldPort);
  end;

  procedure FlexResize;
{ Called when the Flex window is resized. }
  begin
    ClipOpen;
    SetScrollBars;
    ClipBars;
  end;

  procedure FlexActivate; { (on : boolean) }
{ Called when the Flex window is resized. }
    var
      i, s, e: integer;
      oldPort: GrafPtr;
  begin
    GetPort(oldPort);
    SetPort(FlexWPtr);
    s := dyItemtoItem(EditMHndl, editStart);
    e := dyItemtoItem(EditMHndl, editEnd);
    for i := s to e do
      EnDisItem(EditMHndl, i, on);
    if FlexWindowOn then
      begin
        ClipOpen;
        DrawGrowIcon(FlexWPtr);
        if on then
```

```
        begin
          SetScrollBars;
        end
      else
        begin
          HideControl(ScrollH);
          HideControl(ScrollV);
        end;
      ClipBars;
    end;
  if on = false then                { Flex window is becoming deactivated, reorder the DM's if }
    if NotOrdered <> 0 then         { they should be reordered. }
      ReorderDMs(true);
  SetPort(oldPort);
end;

procedure Scrollto (doHorz: boolean; newStart: integer);
  { Scroll the flex window either horizontally or vertically to the new start pos. }
  var
    rgn: RgnHandle;
    h, v: integer;
    r: Rect;
begin
  ClipBars;
  rgn := NewRgn;
  h := 0;
  v := 0;
  if doHorz then
    h := OriginH - newStart
  else
    v := OriginV - newStart;
  if (h <> 0) or (v <> 0) then
    begin
      r := FlexWPtr^.portRect;
      ScrollRect(r, h, v, rgn);
      InvalRgn(rgn);
      OriginH := OriginH - h;
      OriginV := OriginV - v;
      if scrollHorz then
        scrollStart := OriginH
      else
        scrollStart := OriginV;
      AnchorScrollBars;
      BeginUpdate(FlexWPtr);
      FlexUpdate;
      EndUpdate(FlexWPtr);
    end;
  DisposeRgn(rgn);
end;

procedure ScrollBoth (newHStart, newVStart: integer);
  { Scroll the flex window both horizontally or vertically to the new start pos. }
  var
```

```
    rgn: RgnHandle;
    h, v: integer;
    r: Rect;
begin
  ClipBars;
  rgn := NewRgn;
  h := OriginH - newHStart;
  v := OriginV - newVStart;
  if (h <> 0) or (v <> 0) then
    begin
      r := FlexWPtr^.portRect;
      ScrollRect(r, h, v, rgn);
      InvalRgn(rgn);
      OriginH := OriginH - h;
      OriginV := OriginV - v;
      if scrollHorz then
        scrollStart := OriginH
      else
        scrollStart := OriginV;
      AnchorScrollBars;
      BeginUpdate(FlexWPtr);
      FlexUpdate;
      EndUpdate(FlexWPtr);
    end;
  DisposeRgn(rgn);
end;

procedure ScrollAction (cH: ControlHandle; partCode: integer);
  var
    newStart: integer;
begin
  case partCode of
    inUpButton:
      newStart := maxOf(scrollStart - 10, scrollMin);
    inDownButton:
      newStart := minOf(scrollStart + 10, scrollMax);
    inPageUp:
      newStart := maxOf(scrollStart - (scrollPage), scrollMin);
    inPageDown:
      newStart := minOf(scrollStart + (scrollPage), scrollMax);
    otherwise
      newStart := scrollStart;
  end;
  ClipOpen;
  SetCtlValue(cH, newStart);
  Scrollto(ScrollHorz, newStart);
  ClipOpen;
end;

procedure FlexControl (part: integer; ctl: ControlHandle; event: EventRecord);
begin
  scrollHorz := (ctl = ScrollH);
  with FlexWPtr^.portRect do
```

```
    if scrollHorz then
      begin
        scrollMin := totalBound.left;
        scrollMax := totalBound.right;
        scrollStart := OriginH;
        scrollPage := (right - left) div 2;
      end
    else
      begin
        scrollMin := totalBound.top;
        scrollMax := totalBound.bottom;
        scrollStart := OriginV;
        scrollPage := (bottom - top) div 2;
      end;
  if part = inThumb then
    begin
      part := TrackControl(ctl, event.where, nil);
      if part = inThumb then
        begin
          Scrollto(scrollHorz, GetCtlValue(ctl));
        end;
    end
  else
    begin
      part := TrackControl(ctl, event.where, @ScrollAction);
    end;
  ClipBars;
end;

procedure HandScroll (startPt: Point);
  { Scroll the flex window by the user dragging it with the mouse turned into a hand. }
  var
    pt, lastpt: point;
    h, v: integer;
begin
  ClipOpen;
  SetCursor(HandCurs^^);
  lastpt := startPt;
  startPt.h := startPt.h + OriginH;
  startPt.v := startPt.v + OriginV;
  while StillDown do
    begin
      ClipOpen;
      GetMouse(pt);
      if not EqualPt(pt, lastpt) then
        begin
          h := MinMaxOf(totalBound.left, startPt.h - pt.h, totalBound.right);
          v := MinMaxOf(totalBound.top, startPt.v - pt.v, totalBound.bottom);
          SetCtlValue(ScrollH, h);
          SetCtlValue(ScrollV, v);
          ClipBars;
          ScrollBoth(h, v);
          lastpt := pt;
```

```
      end;
    end;
   InitCursor;
   ClipBars;
  end;

  procedure CenterSelections;
   { Center the current selection (both dm's and pictures) so they appear }
   { in the center of the currently visible flex window. }
   var
    pi: PicInfoHandle;
    fh: FlexHandle;
    xoffset, yoffset: integer;
    r: Rect;
    oldPort: GrafPtr;

   procedure OffsetIt (var dm: DMRec; flexH: FlexHandle);
   begin
    with dm.visLoc do
     begin
      h := h + xoffset;
      v := v + yoffset;
     end;
   end;
  begin
   GetPort(oldPort);
   SetPort(FlexWptr);
   SetOrigin(OriginH, OriginV);
   if SelecRoot <> nil then
    r := SelecRoot^^.boxRect
   else if PicSelRoot <> nil then
    r := PicSelRoot^^.bounds;
   fh := SelecRoot;
   while fh <> nil do
    begin
     UnionRect(r, fh^^.boxRect, r);
     fh := fh^^.nextSelH;
    end;
   if PicSelRoot <> nil then
    begin
     pi := PicSelRoot;
     while pi <> nil do
      begin
       UnionRect(r, pi^^.bounds, r);
       pi := pi^^.nextsel;
      end;
    end;
   with FlexWPtr^.portRect do
    begin
     xoffset := ((right - left) - (r.right - r.left)) div 2;
     xoffset := left + xoffset - r.left;
     yoffset := ((bottom - top) - (r.bottom - r.top)) div 2;
     yoffset := top + yoffset - r.top;
```

```
    end;
   dotoSelec(OffsetIt);
   pi := PicSelRoot;
   while pi <> nil do
     begin
       OffsetRect(pi^^.bounds, xoffset, yoffset);
       pi := pi^^.nextsel;
     end;
   FlexRedo(true);
   SetOrigin(0, 0);
   SetPort(oldPort);
  end;

{ Selection Algorithm stuff. }
  procedure InvertPicSel (p: PicInfoHandle);
   { Invert whatever it is that show's a picture selection. }
   var
     ps: PenState;
  begin
   GetPenState(ps);
   PenMode(patXor);
   PenSize(1, 1);
   FrameRect(p^^.bounds);
   SetPenState(ps);
  end;

  procedure DeSelectAllPics;
   var
     pi, p2: PicInfoHandle;
  begin
   pi := PicSelRoot;
   while pi <> nil do
     begin
       p2 := pi;
       InvalRect(p2^^.bounds);
       pi := pi^^.nextsel;
       p2^^.nextsel := nil;
     end;
   PicSelRoot := nil;
  end;

  procedure DeSelectAll;
   var
     fh: FlexHandle;
     i: integer;
  begin
   while SelecRoot <> nil do
     begin
       fh := SelecRoot;
       SelecRoot := fh^^.nextSelH;
       fh^^.selected := false;
       fh^^.nextSelH := nil;
       InvertRoundRect(fh^^.boxRect, ovWd, ovHt);
```

```
    end;
  SelecRoot := nil;
  DeSelectAllPics;
end;

procedure SelectThis (flexH: FlexHandle);
begin
  if not flexH^^.selected then
    begin
      flexH^^.nextSelH := SelecRoot;
      SelecRoot := flexH;
      InvertRoundRect(flexH^^.boxRect, ovWd, ovHt);
      flexH^^.selected := true;
    end;
end;

procedure DeSelectThis (flexH: FlexHandle);
  var
    h1, h2: FlexHandle;
begin
  if flexH^^.selected then
    begin
      InvertRoundRect(flexH^^.boxRect, ovWd, ovHt);
      flexH^^.selected := false;
      if SelecRoot = flexH then
        SelecRoot := flexH^^.nextSelH
      else if SelecRoot <> nil then
        begin
          h1 := SelecRoot;
          h2 := SelecRoot^^.nextSelH;
          while (h2 <> nil) and (h2 <> flexH) do
            begin
              h1 := h2;
              h2 := h2^^.nextSelH;
            end;
          if h2 = flexH then
            h1^^.nextSelH := h2^^.nextSelH;
        end;
    end;
end;

procedure SelectThisPic (pic: PicInfoHandle; disp: Boolean);
  { Add this pic to the list of currently selected pics. }
begin
  if not PicSelected(pic) then
    begin
      pic^^.nextsel := PicSelRoot;
      PicSelRoot := pic;
      if disp then
        InvertPicSel(pic);
    end;
end;
```

```
procedure DeSelectThisPic (pic: PicInfoHandle);
  { Delete this pic from the list of currently selected pics. }
  var
    i, j: integer;
    p1: PicInfoHandle;
begin
  if PicSelected(pic) then
    begin
      InvalRect(pic^^.bounds);
      if PicSelRoot = pic then
        PicSelRoot := pic^^.nextsel
      else
        begin
          p1 := PicSelRoot;
          while p1 <> nil do
            begin
              if p1^^.nextsel = pic then
                begin
                  p1^^.nextsel := p1^^.nextsel^^.nextsel;
                  leave;
                end;
              p1 := p1^^.nextsel;
            end;
        end;
    end;
end;

procedure DragSelections (oldpt: Point);
  { User started on a selected object and is moving the mouse.  Drag an outline of all the selected }
  { objects around until the mouse button is let up. }
  var
    i: integer;
    fh: FlexHandle;
    oldr, newr, r, picR: Rect;
    offset: Point;
  procedure AddPicsRect (var r: Rect);
    var
      pi: PicInfoHandle;
  begin
    if EmptyRect(r) and (PicSelRoot <> nil) then
      r := PicSelRoot^^.bounds;
    pi := PicSelRoot;
    while pi <> nil do
      begin
        UnionRect(r, pi^^.bounds, r);
        pi := pi^^.nextsel;
      end;
  end;

begin
  SetRect(oldr, 0, 0, 0, 0);
  newr := oldr;
  ClipBars;
```

```
    fh := SelecRoot;
    if SelecRoot <> nil then
      oldr := BandRect(fh^^);
    while fh <> nil do
      begin
        UnionRect(oldr, BandRect(fh^^), oldr);
        fh := fh^^.nextSelH;
      end;
    AddPicsRect(oldr);
    offset := DragBoxes(oldpt);
    fh := SelecRoot;
    if SelecRoot <> nil then
      newr := BandRect(fh^^);
    while fh <> nil do
      begin
        UnionRect(newr, BandRect(fh^^), newr);
        fh := fh^^.nextSelH;
      end;
    AddPicsRect(newr);
    UnionRect(newr, oldr, newr);
    InvalRect(newr);
    for i := 0 to numOfDMRec do
      if DMRecsPtr^[i].flexH <> nil then
        with DMRecsPtr^[i] do
          if flexH^^.selected then
            visLoc := flexH^^.boxRect.topleft; { set the DM's display point. }
    FileDirty[dmFile] := true;
  end;

  procedure DragAndSelect (pt: Point);
{ The user clicked on nothing, drag a gray rectangle around until the user lets the mouse up. }
{ Then select all the DM's that intersect with the rectangle.  If nothing intersects set the }
{ point that adds will appear at to the start point. }
    var
      r, foo: Rect;
      i: integer;
      foundOne: boolean;
      p: PicInfoHandle;
  begin
    ClipBars;
    r := DragRect(pt);
    foundOne := false;
    for i := 0 to numOfDMRec do
      if DMRecsPtr^[i].flexH <> nil then
        with DMRecsPtr^[i] do
          if SectRect(r, flexH^^.boxRect, foo) then
            begin
              SelectThis(flexH);
              foundOne := true;
            end;
    p := PicRoot;
    while p <> nil do
      begin
```

```
      if SectRect(r, p^^.bounds, foo) then
        begin
          SelectThisPic(p, true);
          foundOne := true;
        end;
      p := p^^.next;
    end;
  if not foundOne then
    AddPoint := pt;
end;

function PopupTreeNames (pt: Point; var dm: DMRec): Boolean;
  { Bring up a pop-up menu that lets you select a new input. }
  var
    n: NameStr;
    six: signedByte;
    idx: integer;
    gotit: Boolean;
begin
  with dm do
    begin
      idx := (pt.v - (FlexH^^.boxRect.top + 2)) div 4;
      if (idx >= inputs) then
        begin
          sysbeep(3);
          exit(PopupTreeNames);
        end;
      if slotsIn[idx].kind = frmTree then
        begin
          n := slotsIn[idx].name;
          six := slotsIn[idx].inIdx;
        end
      else
        begin
          n := '';
          six := 0;
          popUpNames := true;
        end;
      if popUpNames then
        gotit := popUpPointNames(pt, n, six)
      else
        gotit := popUpPointAxis(pt, six);
      if gotit then
        begin
          slotsIn[idx].name := n;
          slotsIn[idx].inIdx := six;
          slotsIn[idx].kind := frmTree;
          InvalRect(BandRect(dm.flexH^^)); { invalidate old rectangle to erase. }
          UpdateOneFlex(dm);
          FileDirty[dmFile] := true;
        end;
      popUpNames := not popUpNames;
    end;
```

```
end;

procedure FlextoEdit (dmnum: integer);
  var
    dm: DMRec;
begin
  dm := DMRecsPtr^[dmNum];
  if EditDMmodule(dm) then
    begin
      InvalRect(BandRect(dm.FlexH^^)); { invalidate old rectangle to erase. }
      DeSelectThis(dm.FlexH);
      DMRecsPtr^[dmNum] := dm;
      ReorderDMs(false);
      MakeFlexBox(DMRecsPtr^[dmNum], false);
      SelectThis(dm.FlexH);               { MakeFlexBox clears this. }
      MakeAllLines;
      InvalRect(BandRect(dm.FlexH^^)); { invalidate new rectangle to force draw. }
      FileDirty[dmFile] := true;
      popUpNames := true;
    end;
end;

procedure FlexMouse; { (event : EventRecord) }
  { Handle a mouse down event in the Flex window. }
  var
    pt, pt2: Point;
    found, double, tofar, shiftDown: boolean;
    i, dmNum: integer;
    oldBox: FlexRec;
    oldPort: GrafPtr;
    dm: DMRec;
    ctl: ControlHandle;
    r: Rect;
    hotFlex: FlexHandle;
    hotPic: PicInfoHandle;
    hotPicId: integer;

  function CheckPicHit (pt: Point): PicInfoHandle;
      { Return a handle to a pict if the given point is inside the pict. }
    var
      i: integer;
      r: Rect;
      pic, hitPic: PicInfoHandle;
  begin
    hitPic := nil;
    pic := PicRoot;
    while pic <> nil do
      begin
        if PtinRect(pt, pic^^.bounds) then
          hitPic := pic;
        pic := pic^^.next;
      end;
    CheckPicHit := hitPic;
```

```
end;

procedure ConnectDMInput (start: Point; ConnectAll: Boolean);
{ Allow the user to drag a line from an input on this DM to an output on another DM to connect the two. }
{ If ConnectAll is true then connect all the inputs of this DM to the outputs of the other. }
  var
    ps: PenState;
    pt, oldpt: point;
    i, idx, outIdx, otherDM: integer;
    str: string;
    gotHookup: Boolean;
    wind: WindowPtr;

  procedure GetRawIn (pt: Point);
      { The user dragged an input line to the raw window. Figure out which raw slot the }
      { mouse was on and hookup to that. }
    var
      rawname: NameStr;
  begin
    rawname := RawPtName(pt);
    if rawname = '' then
      sysbeep(3)
    else
      with DMRecsPtr^[dmNum] do
        begin
          slotsIn[Idx].name := RawPtName(pt);
          slotsIn[Idx].kind := frmRaw;
          slotsIn[Idx].inIdx := 0;
          gotHookup := true;
        end;
  end;
begin
  gotHookup := false;
  with DMRecsPtr^[dmNum] do
    begin
      idx := (start.v - (FlexH^^.boxRect.top + 2)) div 4;
      if (idx >= inputs) then
        begin
          sysbeep(3);
          exit(ConnectDMInput);
        end;
      if false then
        Announce(StringOf('Connecting ', name, ' input ', idx + 1 : 1, '.'));
      start.v := FlexH^^.boxRect.top + 2 + idx * 4;
    end;
  oldpt := start;
  GetPenState(ps);
  PenPat(gray);
  PenSize(1, 1);
  PenMode(patXor);
  MoveTo(start.h, start.v);    { Draw first }
  LineTo(oldpt.h, oldpt.v);
  while StillDown do
```

```
      begin
        GetMouse(pt);
        if not equalPt(pt, oldpt) then
          begin
            MoveTo(start.h,  start.v);     { Draw new }
            LineTo(pt.h,  pt.v);
            MoveTo(start.h,  start.v);     { Erase old }
            LineTo(oldpt.h,  oldpt.v);
          end;
        oldpt := pt;
      end;
    MoveTo(start.h,  start.v);     { Erase last }
    LineTo(pt.h,  pt.v);
    SetPenState(ps);
    LocaltoGlobal(pt);
    case FindWindow(pt, wind) of
      inDesk:

        with DMRecsPtr^[dmNum] do
          begin
            slotsIn[Idx].name := '';
            gotHookup := true;
          end;
      inContent:
        begin
          if wind = FlexWPtr then
            begin
              GlobaltoLocal(pt);
              { Check other Flex's for a hit }
              otherDM := -1;
              for i := 0 to numOfDMRec do
                with DMRecsPtr^[i] do
                  if flexH <> nil then
                    if PtinRect(pt, flexH^^.boxRect) then
                      begin
                        otherDM := i;
                        leave;
                      end;
              if otherDM < 0 then { didn't find anything }
                sysbeep(3)
              else
                begin       { We have a hit }
                  gotHookup := true;
                  with DMRecsPtr^[otherDM] do
                    begin
                      outIdx := (pt.v - (FlexH^^.boxRect.top + 2)) div 4;
                      if (outIdx >= outputs) then
                        begin
                          sysbeep(3);
                          exit(ConnectDMInput);
                        end
                    end;
                  with DMRecsPtr^[dmNum] do
```

```
                if ConnectAll then
                  begin         { If ConnectAll then connect all the }
                    for i := 0 to 5 do
                      begin     { inputs this DM has to all the outputs possible. }
                        if inputs <= i then
                          leave
                        else if DMRecsPtr^[otherDM].outputs <= i then
                          leave;
                        slotsIn[i].name := DMRecsPtr^[otherDM].name;
                        slotsIn[i].kind := frmDM;
                        slotsIn[i].inIdx := i;
                      end;
                  end
                else
                  begin
                    slotsIn[Idx].name := DMRecsPtr^[otherDM].name;
                    slotsIn[Idx].kind := frmDM;
                    slotsIn[Idx].inIdx := outIdx;
                  end;
              end;
            end
          else if wind = RawDesc.wp then
            GetRawIn(pt);
        end;
      otherwise
        sysbeep(3);
    end;
    if gotHookup then
      begin
        DeSelectAll;
        InvalRect(BandRect(DMRecsPtr^[dmNum].flexH^^));   { invalidate old rectangle to erase. }
        CheckDMsOrder(dmNum);
        UpdateOneFlex(DMRecsPtr^[dmNum]);
        FileDirty[dmFile] := true;
        popUpNames := true;
      end;
  end;

begin
  GetPort(oldPort);
  SetPort(FlexWPtr);
  ClipOpen;
  shiftDown := (BAND(event.modifiers, shiftKey) <> 0);
  pt := event.where;      { will be local coordinates after SetOrigin }
  GlobaltoLocal(event.where);
  i := FindControl(event.where, FlexWPtr, ctl);
  if (i <> 0) then                                   { If a control was hit then }
    FlexControl(i, ctl, event)                     { handle it }
  else if BAND(event.modifiers, optionKey) <> 0 then { Else if option key down }
    HandScroll(event.where)                          { Then drag the window around. }
  else
    begin
      ClipBars;
```

```
GlobaltoLocal(pt);
found := false;
hotPic := nil;
   { First check in the selected boxes for a hit }
for i := 0 to numOfDMRec do
  with DMRecsPtr^[i] do
    if flexH <> nil then
      if flexH^^.selected then
        if PtinRect(pt, flexH^^.boxRect) then
          begin
            found := true;
            dmNum := i;
            leave;
          end;
   { If not found then check in unselected boxes for a hit. }
if not found then
  for i := 0 to numOfDMRec do
    with DMRecsPtr^[i] do
      if flexH <> nil then
        if not flexH^^.selected then
          if PtinRect(pt, flexH^^.boxRect) then
            begin
              found := true;
              dmNum := i;
              leave;
            end;
if not found then
  begin                { mouseclick not on DM, is it on a picture? }
    hotPic := CheckPicHit(pt);
    if hotPic <> nil then
      begin           { yes, but was the picture already selected? }
        if PicSelected(hotPic) then
          found := true                  { yes, then let them grab it. }
        else
          hotPic := nil;                 { else make them drag a grey rect. }
      end;
  end;
double := false;       { will be true if double-click }
tofar := false;        { will be true if mouse moved to far for double-click }
if (abs(lastpt.h - pt.h) < 3) and (abs(lastpt.v - pt.v) < 3) then
  begin
      { if the mouse has hardly moved from the last time here. }
    if ((Ticks^ - LastUpTick) < GetDblTime) then { and within doubletime }
      begin  { Set double-click flag. }
        LastTick := 0;
        double := true;
        SetPt(lastPt, -2000, -2000);
        while StillDown do
          ;
      end;
  end;
if not double then
  begin
```

```
      while StillDown and not tofar do
        begin   { wait until mouseup or mouse moves. }
          GetMouse(pt2);
          if (abs(pt2.h - pt.h) > 3) or (abs(pt2.v - pt.v) > 3) then
            tofar := true;      { mouse has moved, start drag. }
          if found and (TickCount - event.when > 45) then
            with DMRecsPtr^[dmNum].flexH^^.boxRect, pt do
              if (h >= left) and (h <= left + TabWidth + 2) then
                begin
                  if PopupTreeNames(pt, DMRecsPtr^[dmNum]) then
                    ;
                  found := false;
                end;
        end;
      LastTick := event.when;
      lastPt := pt2;
    end;
  if not found then
    begin       { Not clicked on a Flex box, }
      if BAND(event.modifiers, shiftkey) = 0 then     { If shift key not down then }
        DeselectAll;            { Deselect everything. }
      if toFar then             { If the mouse is moving }
        DragAndSelect(pt);      { drag a gray rectangle around. }
    end
  else if hotPic <> nil then
    begin
          { User clicked on a picture.  do whatever. }
      if shiftDown then
        begin { If shift key down then toggle selection of this picture. }
          if PicSelected(hotPic) then
            DeSelectThisPic(hotPic)
          else
            SelectThisPic(hotPic,  true);
        end
      else if not PicSelected(hotPic) then
        begin
          DeselectAll;
          SelectThisPic(hotPic,  true);
        end;
      if toFar then
        DragSelections(pt);
    end
  else
    begin
      hotFlex := DMRecsPtr^[dmNum].flexH;
      if shiftDown then
        begin
            { If shift key down then toggle selection of this DM. }
          if hotFlex^^.selected then
            DeSelectThis(hotFlex)
          else
            SelectThis(hotFlex);
        end
```

```
        else if not hotFlex^^.selected then
          begin   { else just select this one. }
            DeselectAll;
            SelectThis(hotFlex);
          end;
        if double then   { Handle double click }
          FlextoEdit(dmNum)
        else if toFar then
          begin
            with DMRecsPtr^[dmNum].flexH^^.boxRect, pt do
              if (h >= left) and (h <= left + TabWidth + 2) then
                ConnectDMInput(pt, ((BAND(event.modifiers, cmdKey) <> 0)))  { cmd key is power connect.
    }
              else
                DragSelections(pt);
          end;
      end;        { if found }
    end;
  ClipBars;
  SetPort(oldPort);
end;

procedure FlexDelete (var dm: DMRec; updateFlex: boolean);
  var
    oldPort: GrafPtr;
begin
  if dm.flexH <> nil then
    begin
      if updateFlex and FlexWindowOn then
        begin
          GetPort(oldPort);
          SetPort(FlexWptr);
          SetOrigin(OriginH, OriginV);
          ClipBars;
          DeSelectThis(dm.flexH);
          EraseBox(dm.flexH^^);
          InvalRect(boundRect(dm.flexH^^));
          SetOrigin(0, 0);
          SetPort(oldPort);
        end;
    end;
  DisposHandle(Handle(dm.flexH));
  dm.flexH := nil;
end;

procedure UpdateOneFlex; { (var dm: DMRec) }
{ If the flex window is on then update this dm's flex box display.  This is called }
{ when someone else edits the DM and wants to reflect the changes. }
  var
    oldPort: GrafPtr;
begin
  if FlexWindowOn then
    begin
```

```
      GetPort(oldPort);
      SetPort(FlexWptr);
      SetOrigin(OriginH, OriginV);
      ClipBars;
      InvalRect(BandRect(dm.flexH^^)); { invalidate old rectangle to force draw. }
      MakeFlexBox(dm, true);
      MakeAllLines;
{ MakeFlexLines(dm); }
      InvalRect(BandRect(dm.flexH^^)); { invalidate new rectangle to force draw. }
      SetOrigin(0, 0);
      SetPort(oldPort);
    end;
  end;

  procedure FlexAdd; { (var dm : DMRec) }
{ Add this DM to the Flex Window display. It has already been added to the DMList. }
    var
      oldPort: GrafPtr;
  begin
    dm.flexH := nil;
    if FlexWindowOn then
      begin
        GetPort(oldPort);
        SetPort(FlexWptr);
        SetOrigin(OriginH, OriginV);
        ClipBars;
        dm.visLoc := AddPoint;
        AddPoint.h := AddPoint.h + 8;
        AddPoint.v := AddPoint.v + 8;
        MakeFlexBox(dm, false);
        MakeFlexLines(dm);
        DeSelectAll;
        SelectThis(dm.flexH);
        InvalRect(boundRect(dm.flexH^^));
        SetOrigin(0, 0);
        SetPort(oldPort);
      end;
  end;

  procedure FlexRedo; { (saveSelected: boolean) }
{ If the Flex window is on then recalculate all the flex positions and redraw }
{ the window based on the current DM info. }
    var
      old: GrafPtr;
  begin
    if FlexWindowOn then
      begin
        GetPort(old);
        SetPort(FlexWPtr);
        DMsToFlex(saveSelected);
        SetScrollBars;
        InvalRect(FlexWPtr^.portRect);
        SetPort(old);
```

```
    end;
  end;

  procedure FlexWindow; {• on : boolean);•}
    var   { Set the state of the Flex window to on/off. }
      i: integer;
  begin
    if FlexWindowOn <> on then
      begin
        if on then
          begin
            ShowWindow(FlexWPtr);
            SelectWindow(FlexWPtr);
            FlexRedo(false);
          end
        else
          HideWindow(FlexWPtr);
      end;
    i := dyItemtoItem(WindMHndl, FlexWDyItem);
    CheckItem(WindMHndl, i, on);
  end;

  procedure FlexwindMenu; { (dyItem : integer) }
{ This get's called by the dynamic menu manager when the Windows/Flex item }
{ is hit.  Either bring the window to the front, turn it on or turn it off. }
    var
      i: integer;
  begin
    if FlexWindowOn and (FlexWPtr <> FrontWindow) then
      SelectWindow(FlexWPtr)
    else
      FlexWindow(not FlexWindowOn);
  end;

  type
    SearchDMType = (FindTreeNode, FindDMname, FindDMin, FindDMout, FindDMtype);
  var
    lastFindStr: Str255;
    lastFindCount: integer;
    lastFindKind: SearchDMType;
    lastMatchState: Boolean;

  function SearchDMs (findKind: SearchDMType; str: Str255; findCount: integer; exact: Boolean):
        Boolean;
{ Ask the user for a DM name.  Try to find it and move the flex window to put it in the center. }
    var
      str2:  str255;
      i, j, xoffset, yoffset: integer;
      oldPort: GrafPtr;
      f, found: Boolean;
      r: Rect;
  begin
    found := false;
```

```
GetPort(oldPort);
SetPort(FlexWPtr);
SetOrigin(OriginH, OriginV);
UprString(str, true);
for i := 0 to numOfDMRec do
  with DMRecsPtr^[i] do
    begin
      case findKind of
        FindDMname:
          begin
            f := NameMatch(str, name, exact);
          end;
        FindDMin:
          for j := 0 to inputs - 1 do
            begin
              f := NameMatch(str, SlotsIn[j].name, exact);
              if f then
                leave;
            end;
        FindDMout:
          for j := 0 to outputs - 1 do
            begin
              f := NameMatch(str, PointsOut[j].name, exact);
              if f then
                leave;
            end;
        FindDMtype:
          f := NameMatch(str, DMTypes[typeidx].name, exact);
      end;
      if f then
        begin
          findCount := findCount - 1;
          if (FlexH <> nil) and (findCount = 0) then
            begin
              if FlexWindowOn then
                SelectWindow(FlexWPtr)
              else
                FlexWindow(true);
              if not SectRect(FlexH^^.boxRect, FlexWPtr^.portRect, r) then
                with FlexH^^, FlexWPtr^.portRect do
                  begin
                    xoffset := ((right - left) - (boxRect.right - boxRect.left)) div 2;
                    xoffset := boxRect.left - xoffset;
                    yoffset := ((bottom - top) - (boxRect.bottom - boxRect.top)) div 2;
                    yoffset := boxRect.top - yoffset;
                    InvalRect(FlexWPtr^.portRect);
                    DeSelectAll;
                    SelectThis(FlexH);
                    ScrollBoth(xoffset, yoffset);
                  end
              else
                begin
                  ClipBars;
```

```
                DeSelectAll;
                SelectThis(FlexH);
              end;
            found := true;
            leave;
          end;
        end;
    end;
  SearchDMs := found;
  ClipBars;
  SetPort(oldPort);
end;

procedure menuFindDMnext (dyItem: integer);
  var
    str: string;
    found: Boolean;
begin
  lastFindCount := lastFindCount + 1;
  if lastFindKind = FindTreeNode then
    found := SearchTree(mainTreePtr, lastFindStr, lastFindCount, lastMatchState)
  else
    found := SearchDMs(lastFindKind, lastFindStr, lastFindCount, lastMatchState);
  if not found then
    begin
      case lastFindKind of
        FindTreeNode:
          str := 'Tree node';
        FindDMname:
          str := 'DM name';
        FindDMin:
          str := 'DM input';
        FindDMout:
          str := 'DM output';
        FindDMtype:
          str := 'DM type';
      end;
      if lastMatchState then
        AnnounceB(StringOf(str, ' named "', lastFindStr, '" not found.'))
      else
        AnnounceB(StringOf(str, ' with substring "', lastFindStr, '" not found.'));
      lastFindCount := 0;
    end;
end;

procedure menuFind (dyItem: integer);
  const
    FindDialogID = 2024;
    NameEdItem = 1;
    FirstRadioItem = 5;
    LastRadioItem = FirstRadioItem + ord(FindDMType);
    MatchItem = 10;          { 'Match Exactly' check box }
  var
```

```
    i, itemHit: integer;
    dlogPtr: DialogPtr;
    newSearch: SearchDMType;
    newMatch: Boolean;
    str: Str255;
begin
  dlogPtr := GetNewDialog(FindDialogID, nil, Pointer(-1));
  PositionWindow(dlogPtr, 50, 10);
  newSearch := lastFindKind;
  newMatch := lastMatchState;
  RadioRange(dlogPtr, FirstRadioItem, ord(FindDMType) + 1, ord(newSearch));
  RadioOn(dlogPtr, MatchItem, newMatch);
  SetEdText(dlogPtr, NameEdItem, lastFindStr);
  SelEdText(dlogPtr, NameEdItem);
  ShowWindow(dlogPtr);
  repeat
    ModalDialog(nil, itemHit);
    case itemHit of
      FirstRadioItem..LastRadioItem:
        begin
          newSearch := SearchDMType(itemHit - FirstRadioItem);
          RadioRange(dlogPtr, FirstRadioItem, ord(FindDMType) + 1, ord(newSearch));
        end;
      MatchItem:
        begin
          newMatch := not newMatch;
          RadioOn(dlogPtr, MatchItem, newMatch);
        end;
      otherwise
        ;
    end;
  until itemHit <= 2;  { Until OK or Cancel is clicked. }
  GetEdText(dlogPtr, NameEdItem, str);
  DisposDialog(dlogPtr);
  if itemHit = 1 then
    begin { OK clicked. }
      lastFindKind := newSearch;
      lastFindStr := str;
      lastFindCount := 0;
      lastMatchState := newMatch;
      menuFindDMnext(-1);
    end;
end;

procedure EditHeadFoot (dy: integer);
  { Do what it says.  Edit the string that appear as the header and footer. }
  var
    head, foot, prompt1: str255;
    old: GrafPtr;
begin
  prompt1 := 'Header String (#d = date, #p = page, #f = file, #t = time, #clr = Justification)?';
  UseResFile(ApplRes);
  head := GetStrRes(HeadID);
```

```
    foot := GetStrRes(FootID);
    if GetStrings(prompt1, concat(chr(13), 'Footer string?'), head, foot) then
      begin
        UseResFile(ApplRes);
        AddPtrResource(@head, length(head) + 1, 'STR ', HeadID, 'Header');
        AddPtrResource(@foot, length(foot) + 1, 'STR ', FootID, 'Footer');
        GetPort(old);
        SetPort(FlexWPtr);
        InvalRect(FlexWPtr^.portRect);
        SetPort(old);
      end;
  end;

  procedure ShowError (err: integer; str: string);
  begin
    if err <> noErr then
      begin
        Announce(StringOf('Error ', err : 1, str));
      end;
  end;

  procedure AddAsPic (h: Handle; r: Rect);
    { Assume the given handle is a handle to a pict and add it with the given rect as a pict in BE. }
    var
      id: integer;
      pi: PicInfoHandle;
  begin
    UseResFile(ApplRes);
    id := UniqueFlexPICT;
    AddResource(h, 'PICT', id, '');
    ShowError(ResError, StringOf(' adding "PICT" resource #', id : 1, '.'));
    UpdateResFile(ApplRes);
    pi := PicInfoHandle(NewHandle(sizeof(PicInfo)));
    pi^^.bounds := r;
    pi^^.pic := PicHandle(h);
    pi^^.next := PicRoot;
    PicRoot := pi;
    SelectThisPic(pi, false);
    InvalRect(pi^^.bounds);
  end;

  procedure PictureEdit; { (item: integer) }
{ User has selected cut/copy/paste/clear with the flex window formost and nothing selected. }
{ If there currently is a picture selected or one in the clipboard do the action to it. }
    var
      oldPort: GrafPtr;
      r, r1: Rect;
      h: Handle;
      pi: PicInfoHandle;

    procedure PicttoClip;
      { Put all the selected pictures into the clipboard.  The clipboard has already been initialized. }
      var
```

```
      i, err: integer;
      h: Handle;
      pi: PicInfoHandle;
  begin
    pi := PicSelRoot;
    while pi <> nil do
      begin
        HLock(Handle(pi));
        err := PutScrap(sizeof(Rect), RectResType, @pi^^.bounds);
        LoadResource(Handle(pi^^.pic));
        HLock(Handle(pi^^.pic));
        err := PutScrap(GetHandleSize(Handle(pi^^.pic)), 'PICT', Ptr(pi^^.pic^));
        if err <> noErr then
          Announce(StringOf('PutScrap error # ', err : 1, '.'));
        HUnLock(Handle(pi^^.pic));
        HUnLock(Handle(pi));
        pi := pi^^.nextsel;
      end;
  end;
  procedure CliptoPict;
      { Get pictures out of the clipboard and put them into the flex window.  This is made }
      { complicated by the fact that BE puts more than one picture into the clipboard }
      { so you have to search for all of them.  If there are 'RECT' types they are }
      { rectangles for the following picture. }
    type
      HeaderInfo = record
          typ: ResType;
          len: LongInt;
        end;
      HeaderPtr = ^HeaderInfo;
    var
      head: HeaderPtr;
      data: Ptr;
      h: Handle;
      evenlen, berr, endaddr: longInt;
      scrapPtr: PScrapStuff;
      lastRect: Rect;

    procedure TexttoPict (cp: CharsPtr; len: LongInt);
        { Make a pict out of the given text and add it to BE. }
      const
        CR = chr(13);
      var
        i, width, lines, lineheight, lastCR: integer;
        oldh, oldv: integer;
        pic: PicHandle;
        r: Rect;
        finfo: FontInfo;
    begin
      GetFontInfo(finfo);
      with finfo do
        lineheight := ascent + descent + leading;
          { First calculate the enclosing rectangle for the text. }
```

=000344

I

```
      { Width of the longest line by # of lines * lineheight. }
    lines := 0;
    lastCR := 0;
    width := 2;
    for i := 0 to len - 1 do        { Go through looking for carrige returns. }
      if cp^[i] = CR then
        begin     { If any found update the max wid line, # of lines and # of CR's. }
          width := MaxOf(width, TextWidth(Ptr(cp), lastCR, i - lastCR) + 4);
          lines := lines + 1;
          lastCR := i + 1;
        end;
    width := MaxOf(width, TextWidth(Ptr(cp), lastCR, len - lastCR) + 4);
    ClipOpen;
    SetRect(r, 0, 0, width, (lines + 1) * lineheight + 2);
    pic := OpenPicture(r);
    TextBox(Ptr(cp), len, r, teJustCenter);
    ClosePicture;
    ClipBars;
    AddAsPic(Handle(pic), r);
  end;

begin     { CliptoPict }
  berr := LoadScrap;
  DeSelectAllPics;
  scrapPtr := InfoScrap;
  with scrapPtr^ do
    begin
      if scrapSize = 0 then
        exit(CliptoPict);
      if scrapHandle = nil then
        exit(CliptoPict);
      if scrapState <= 0 then
        exit(CliptoPict);
      HLock(scrapHandle);
      endaddr := ord4(scrapHandle^) + scrapSize;
      head := HeaderPtr(scrapHandle^);
      SetRect(lastRect, 0, 0, 0, 0);
      while ord4(head) < endaddr do
        begin
          evenlen := BAND(head^.len + 1, $FFFFFFFE);
          data := Ptr(ord4(head) + sizeof(HeaderInfo));
          with head^ do
            if typ = RectResType then
              lastRect := RectPtr(data)^
            else if typ = 'PICT' then
              begin
                h := NewHandle(evenlen);
                if h <> nil then
                  begin
                    BlockMove(data, h^, evenlen);
                    if EmptyRect(lastRect) then
                      lastRect := PicPtr(data)^.picFrame;
                    AddAsPic(h, lastRect);
```

```
                SetRect(lastRect, 0, 0, 0, 0);
              end;
            end
          else if typ = 'TEXT' then
            TexttoPict(CharsPtr(data), len)
          else if typ = DMResType then
            begin
            end
          else
            begin
            end;
        head := HeaderPtr(ord4(head) + sizeof(HeaderInfo) + evenlen);
      end;
    HUnlock(scrapHandle);
  end;
end;

procedure ClearPicts;
  var
    i, id: Integer;
    pi, p1, p2: PicInfoHandle;
begin
  pi := PicSelRoot;
  while pi <> nil do
    begin
      if pi = PicRoot then
        PicRoot := pi^^.next
      else
        begin
          p1 := PicRoot;
          while p1^^.next <> nil do
            begin
              if p1^^.next = pi then
                begin
                  p1^^.next := pi^^.next;
                  leave;
                end;
              p1 := p1^^.next;
            end;
        end;
      InvalRect(pi^^.bounds);
      RmveResource(Handle(pi^^.pic));
      DisposHandle(Handle(pi^^.pic));
      p1 := pi;
      pi := pi^^.nextsel;
      DisposHandle(Handle(p1));
    end;
  UpdateResFile(ApplRes);
  FileDirty[dmFile] := true;
  popUpNames := true;
  PicSelRoot := nil;
end;
begin
```

```
    GetPort(oldPort);
    SetPort(FlexWptr);
    SetOrigin(OriginH, OriginV);
    ClipBars;
    UseResFile(ApplRes);
    case item of
      1:
       ;          {undo}
      3:   {cut}
        if PicSelRoot <> nil then
          begin
            PicttoClip;
            ClearPicts;
          end;
      4:   {copy}
        if PicSelRoot <> nil then
          PicttoClip;
      5:   {paste}
        begin
          CliptoPict;
        end;
      6:   {clear}
        ClearPicts;
    end;  { case }
    SetPort(oldPort);
  end;

  procedure FlexReorder (dyItem: integer);
{ Reorder the DM's in the flex window so they aren't stacked on top of each other. }
    const
      hStart = 75;
    var
      i, nextH, nextV: integer;
  begin
    nextH := hStart;
    nextV := 20;
    for i := 0 to numOfDMRec do
      with DMRecsPtr^[i] do
        if flexH <> nil then
          begin
            with flexH^^.boxRect do
              OffsetRect(flexH^^.boxRect, nextH - left, nextV - top);
            visLoc := flexH^^.boxRect.topleft; { set the DM's display point. }
            FileDirty[dmFile] := true;
            if nextH = hStart then
              nextH := 300
            else
              begin
                nextH := hStart;
                nextV := nextV + 50;
              end;
          end;
    MakeAllLines;
```

```
    SetScrollBars;
    FlexUpdate;
  end;

  procedure dotoSelec;{• (procedure doit (var dm : DMRec;•}
                       {•       flexH : FlexHandle));•}
    var
      fh: FlexHandle;
      i: integer;
      oldPort: GrafPtr;
  begin
    GetPort(oldPort);
    SetPort(FlexWPtr);
    SetOrigin(OriginH, OriginV);
    fh := SelecRoot;
    while fh <> nil do
      begin
        for i := 0 to numOfDMRec do
          if fh = DMRecsPtr^[i].flexH then
            doit(DMRecsPtr^[i], fh);
        fh := fh^^.nextSelH;
      end;
    DMCodeInvalid := true;
    SetOrigin(0, 0);
    SetPort(oldPort);
  end;

    { Toggle the selected DM's on or off. }
  procedure SelecOnOff (dyItem: integer);
    procedure onoff (var dm: DMRec; flexH: FlexHandle);
    begin
      if dm.state <> on then
        begin
          dm.state := on;
        end
      else
        dm.state := usrOff;
      HookupIO(dm);
      flexH^^.ison := (dm.state = on);
      InvalRect(BoundRect(flexH^^));
      FileDirty[dmFile] := true;
    end;
  begin
    dotoSelec(onoff);
  end;

{ Toggle all the selected Flex's Displays on or off based on the state of the first DM found. }
  procedure SelecDisplay (dyItem: integer);
    var
      found, onState: boolean;
    procedure disponoff (var dm: DMRec; flexH: FlexHandle);
    begin
      if not found then
```

```
      begin            { Set all selected DM's to the opposite of first found. }
        onState := not dm.dispLast;
        found := true;
      end;
    dm.displast := onState;
    SetDisplay(dm, dm.dispLast);
    FileDirty[dmFile] := true;
  end;
begin
  found := false;
  dotoSelec(disponoff);
end;

  { Set all the selected DM's to show their input and output values. }
procedure SelecShowVal (dyItem: integer);
  var
    found, onState: boolean;
  procedure show (var dm: DMRec; flexH: FlexHandle);
  begin
    if not found then
      begin            { Set all selected DM's to the opposite of first found. }
        onState := not dm.dispLast;
        found := true;
      end;
    with flexH^^ do
      begin
        InsetRect(boxRect, -10, -50);
        boundRect := boxRect;
        OffsetRect(boundRect, -boxRect.left, -boxRect.top);
      end;
    SetLines(FlexH^^);
    InvalRect(BandRect(flexH^^));
    FileDirty[dmFile] := true;
  end;
begin
  found := true;
  dotoSelec(show);
end;

{ Send a calibrate message to all the selected Flex's. }
procedure SelecCalib (dyItem: integer);
  procedure doCalib (var dm: DMRec; flexH: FlexHandle);
  begin
    doVerb(calibDM, dm);
    FileDirty[dmFile] := true;
  end;
begin
  dotoSelec(doCalib);
end;

{ Let the user set the output type for all the selected Flex's. }
procedure SelecOutType (dyItem: integer);
  var
```

```
    stop, changed: Boolean;
  procedure doSelectOut (var dm: DMRec; flexH: FlexHandle);
  begin
    if not stop then
      if SetDMOutput(dm) then
        begin
          FileDirty[dmFile] := true;
          changed := true;
        end
      else
        stop := true;
  end;
begin
  stop := false;
  changed := false;
  dotoSelec(doSelectOut);
  if changed then
    HookupAllDMs;
end;

{--------------------------------------------}
{ Print routines                             }
{--------------------------------------------}

procedure PrintInit;
  var
    errStr: string;
begin
  errStr := '';
  PrintStuff := nil;
  PrOpen;
  if PrError <> noErr then
    errStr := StringOf('Printer Driver open failed, error #', PrError : 1)
  else
    begin
      PrintStuff := THPrint(GetResource('PREC', 0));
      if (PrintStuff = nil) then
        errStr := 'GetResource("PREC", 0) failed.'
      else
        DetachResource(Handle(PrintStuff));
    end;
  PrClose;
  if errStr <> '' then
    AnnounceB(errStr);
end;

procedure PrintStyle;
  var
    temp: boolean;
    errStr: string;
begin
  if PrintStuff = nil then
    PrintInit;
```

```
  if PrintStuff = nil then
    exit(PrintStyle);

  errStr := '';
  PrOpen;
  if PrError <> noErr then
    Announce(StringOf('PrOpen failed, error #', PrError : 1))
  else
    begin
      temp := PrValidate(PrintStuff);
      temp := PrStlDialog(PrintStuff);
      if PrError <> noErr then
        errStr := StringOf('PrOpen failed, error #', PrError : 1);
    end;
  PrClose;
  if errStr <> '' then
    Announce(errStr);
end;

procedure PrintFlex;
  var
    temp: boolean;
    oldPort: GrafPtr;
    i, hz, vt, horzPages, vertPages, Hoffset, Voffset, oldres: integer;
    myStRec: TPrStatus;
    errStr: string;
    r, total: Rect;
    pInfo: TPrInfo;
    topleft: Point;
    TextdPtr: DialogPtr;
begin
  if PrintStuff = nil then
    PrintInit;
  if PrintStuff = nil then
    exit(PrintFlex);

  errStr := '';
  GetPort(oldPort);
  DMsToFlex(false);
  total := CalcTotalRect;
  topleft := total.topleft;
  OffsetRect(total, -total.left, -total.top);
  pInfo := PrintStuff^^.prInfo;
  with pInfo, total do
    begin
      horzPages := total.right div rPage.right + 1;
      vertPages := total.bottom div rPage.bottom + 1;
    end;
  PrOpen;
  if PrError <> noErr then
    errStr := StringOf('PrOpen failed, error #', PrError : 1)
  else if PrJobDialog(PrintStuff) then
    begin
```

```
      TextdPtr := GetNewDialog(justTextID, nil, pointer(-1));
      PositionWindow(TextdPtr, 50, 30);
      SetDlgText(TextdPtr, statText, 1, 'Printing... Press cmd-"." to abort.');
      ShowWindow(TextdPtr);
      DrawDialog(TextdPtr);
      temp := PrValidate(PrintStuff);
      PrintStuff^^.PrJob.pFileName := @CrntfName[dmFile];
      myPrPort := PrOpenDoc(PrintStuff, nil, nil);
      for hz := 1 to horzPages do
        for vt := 1 to vertPages do
          if PrError = noErr then
            begin
              PrOpenPage(myPrPort, nil);
              Hoffset := topleft.h + ((hz - 1) * pInfo.rPage.right);
              Voffset := topleft.v + ((vt - 1) * pInfo.rPage.bottom);
              SetOrigin(Hoffset, Voffset);
              ClipRect(myPrPort^.gPort.portRect);
              TextSize(9);
              TextFont(1);
              if PrError = noErr then
                begin
                  BackGround(myPrPort^.gPort.portRect, false);
                  DrawIn(myPrPort^.gPort.portRect);
                end;
              SetOrigin(0, 0);
              PrClosePage(myPrPort);
            end;
      PrCloseDoc(myPrPort);
      if (PrError = noErr) and (PrintStuff^^.prJob.bJDocLoop = bSpoolLoop) then
        PrPicFile(PrintStuff, nil, nil, nil, myStRec);
      if PrError <> noErr then
        errStr := StringOf('PrError = ', PrError : 1);
      DisposDialog(TextdPtr);
    end;
  PrClose;
  SetPort(oldPort);
  if errStr <> '' then
    AnnounceB(errStr);
end;

procedure DeletePICTs (res: Integer); { Since Flex PICT's actually belong to the DM file, delete }
  const                               { any that are still in the application. }
    ClearItem = 6;                    { item num for Edit/Clear }
  var
    i: integer;
    p, p1: PicInfoHandle;
    h: Handle;
begin
  if res = ApplRes then
    begin
      p := PicRoot;
      while p <> nil do
        begin
```

```
          p1 := p;
          p := p^^.next;
          DisposHandle(Handle(p1));
        end;
      PicRoot := nil;
      PicSelRoot := nil;
    end;
  UseResFile(res);
  for i := FlexPICTstart to FlexPICTend do
    begin
      h := Get1Resource('PICT', i);
      if h <> nil then
        RmveResource(h);
      h := Get1Resource(RectResType, i);
      if h <> nil then
        RmveResource(h);
    end;
  UpdateResFile(res);
end;

procedure InitFlex; { (doAll : boolean) }
{ Called at the begining of the program.  Initializes nessesary stuff. }
  var
    i: integer;
    bounds: Rect;
begin
  PrintInit;
  if doAll then
    begin
      SetRect(bounds, 15, 45, 500, 300);
      FlexWPtr := GetNewWindow(flexWindID, nil, Pointer(-1));
      if FlexWPtr <> nil then
        begin
          if CheckOnScreen(FlexWPtr) then
            ;
        end
      else
        FlexWPtr := NewWindow(nil, bounds, 'Flex', false, documentProc + 8, Pointer(-1), true, 0);
      SetPort(FlexWPtr);
      TextSize(9);
      TextFont(1);
      FlexWDyItem := dyNewItem(WindMHndl, 'Flex', @FlexwindMenu, false);
      i := dyItemtoItem(WindMHndl, FlexWDyItem);
      CheckItem(WindMHndl, i, FlexWindowOn);
{     i := dyNewItem(DMMHndl, 'Flex Reorder', @FlexReorder, false);  }
      i := dyNewItem(DMMHndl, 'Edit Header-Footer', @EditHeadFoot, false);
      i := dyNewItem(EditMHndl, '(-', @menuFind, false);
      i := dyNewItem(EditMHndl, 'Find/F', @menuFind, false);
      i := dyNewItem(EditMHndl, 'Find Next/N', @menuFindDMnext, false);
      i := dyNewItem(EditMHndl, '(-', @menuFind, false);
      editStart := dyNewItem(EditMHndl, '(On-Off/O', @SelecOnOff, true);
      editEnd := dyNewItem(EditMHndl, '(Calibrate/I', @SelecCalib, true);
      editEnd := dyNewItem(EditMHndl, '(Toggle Display', @SelecDisplay, true);
```

-000353

```
{•   editEnd := dyNewItem(EditMHndl, '(Screw Display', @SelecShowVal, true);•}
        editEnd := dyNewItem(EditMHndl, '(Set Output', @SelecOutType, true);
        ScrollH := NewControl(FlexWPtr, bounds, 'V', false, 0, 0, 10, scrollBarProc, 0);
        ScrollV := NewControl(FlexWPtr, bounds, 'H', false, 0, 0, 10, scrollBarProc, 0);
        OriginH := 0;
        OriginV := 0;
        SetPt(AddPoint, 50, 50);
        SelecRoot := nil;
        PicRoot := nil;
        PicSelRoot := nil;
        lastFindStr := '';
        lastFindKind := FindTreeNode;
        lastMatchState := false;
        lastFindCount := 0;
        popUpNames := true;
        DeletePICTs(ApplRes);
      end
    else
      FlexWPtr := nil;
  end;

  procedure CloseFlex;

  begin
    DeletePICTs(ApplRes);
    if FlexWPtr <> nil then
      SaveWindState(FlexWPtr, flexWindID);
  end;

end.
```

```
{ Drawing routines for Flex. }
{ This unit exists because I ran out of room in Flex.pas.  It just has some of the }
{ drawing routines. }

{  By Chuck Blanchard,  10/6/88 }
{  Copyright 1988 VPL Research, Inc.  All rights reserved}

unit FlexDraw;

interface

  uses
    PrintTraps, Globals, Tree3DGlob, MiscRoutines, DMTypes, DMGlobals, HandleDMs;

  const
    ovWd = 8;     { RoundRect oval width and height }
    ovHt = 8;

    TabWidth = 3;         { Width of the input/output tabs on DM's. }

    HeadID = 1501;        { Resource numbers for the header and footer string. }
    FootID = 1502;

  type
    PicInfoPtr = ^PicInfo;
    PicInfoHandle = ^PicInfoPtr;
    PicInfo = record
        next, nextsel: PicInfoHandle;
        pic: PicHandle;
        bounds: Rect;
        id: integer;
      end;
  var
    OriginH, OriginV: integer;
    SelecRoot: FlexHandle;
    PicRoot: PicInfoHandle;
    PicSelRoot: PicInfoHandle;
    totalBound: Rect;
    PrintStuff: THPrint;
    myPrPort: TPPrPort;

  procedure ClipOpen;
  procedure ClipBars;
  function SlotPoint (var box: FlexRec; lr: LeftRightType; slot: integer): Point;
  procedure SetLines (var box: FlexRec);
  procedure DrawBoxLines (box: FlexRec; drawFrom: boolean);
  procedure DrawLeftLines (box: FlexRec);
  procedure FrameBox (box: FlexRec);
  procedure EraseBox (box: FlexRec);
  procedure DrawBox (box: FlexRec; drawFrom: boolean);
  function BoundRect (box: FlexRec): Rect;
  function BandRect (box: FlexRec): Rect;
  function DragBoxes (oldpt: Point): Point;
```

```
  procedure MakeFlexBox (var dm: DMRec; saveSelect: boolean);
  procedure MakeFlexLines (var dm: DMRec);
  procedure MakeAllLines;

  function PicSelected (pic: PicInfoHandle): boolean;
  function GetStrRes (id: integer): Str255;
  procedure DrawIn (r: Rect);
  procedure BackGround (drawRect: Rect; drawPage: boolean);

implementation

  procedure ClipOpen;
   { Set the clip region to be totally open so scrollbars can be drawn. }
   var
    r: Rect;
  begin
   SetOrigin(0, 0);
   SetRect(r, $8001, $8001, $7FFF, $7FFF);
   ClipRect(r);
  end;

  procedure ClipBars;
   { Set the clip region to clip out the scroll bars. }
   var
    r: Rect;
  begin
   SetOrigin(OriginH, OriginV);
   with FlexWPtr^.portRect do
    SetRect(r, left, top, right - 16, bottom - 15);
   ClipRect(r);
  end;

  function SlotPoint;   {•(var box : FlexRec;•}
                        {•      lr : LeftRightType;•}
                        {•      slot : integer) : Point;•}
{ Return the point that lines are drawn to for this box, side, slot. }
   var
    pt: Point;
  begin
   with box do
    if lr = left then
     SetPt(pt, boxRect.left - 1, boxRect.top + slot * 4 + 2)
    else
     SetPt(pt, boxRect.right, boxRect.top + slot * 4 + 2);
   SlotPoint := pt;
  end;

  procedure DrawBoxLines;   {•(box : FlexRec;•}
                            {•      drawFrom : boolean);•}
{ Draw the lines going into this box.  If drawFrom is true then draw the lines }
{ comming in on the right from other Flex boxes. }
   var
```

```
    i: integer;
    lr: leftRightType;
    r: Rect;
    pt: Point;
  begin
    with box do
      begin
        if drawFrom then
          for i := 0 to MaxFrm do
            with frmFlex[i] do
              if frmH <> nil then
                begin
                  pt := SlotPoint(frmH^^, left, slot);
                  moveto(pt.h, pt.v);
                  pt := SlotPoint(box, right, toslot);
                  if not frmH^^.selected then
                    lineto(pt.h, pt.v);
                  frmH^^.slotInfo[left, slot].fixPt := pt;
                end;
        for lr := left to right do
          for i := 0 to lineCount[lr] do
            with slotInfo[lr, i] do
              begin
                if lr = left then
                  moveto(boxRect.left - 1, boxRect.top + i * 4 + 2)
                else
                  moveto(boxRect.right, boxRect.top + i * 4 + 2);
                case state of
                  toFlex, toAbs:
                    begin   { endpoints of lines go to another Flex display. }
                      if drawFrom then
                        lineto(fixPt.h, fixPt.v);
                    end;
                  nameOK, nameNIL:
                    begin { endpoints of lines are relative to box topleft. }
                      lineto(boxRect.left + fixPt.h, boxRect.top + fixPt.v);
                      r := nameBox;
                      OffsetRect(r, boxRect.left, boxRect.top);
                      FrameRoundRect(r, ovWd, ovHt);
                    end;
                  nada:
                    ;
                end;      { case }
              end;
      end;
  end;

  procedure DrawLeftLines; { (box : FlexRec) }
{ Draw the lines leaving this box to the left and going toFlex not }
{ to a name box.  (all the rubberband lines) }
    var
      i: integer;
      lr: leftRightType;
```

```
    r: Rect;
    pt: Point;
begin
  with box do
    for i := 0 to lineCount[left] do
      with slotInfo[left, i] do
        if (state = toFlex) or (state = toAbs) then
          begin
            moveto(boxRect.left - 1, boxRect.top + i * 4 + 2);
            lineto(fixPt.h, fixPt.v)
          end;
end;

procedure FrameBox; { (box : FlexRec) }
begin
  DrawBoxLines(box, true);
  FrameRoundRect(box.boxRect, ovWd, ovHt);
end;

procedure EraseBox; { (box : FlexRec) }
  var
    ps: PenState;
    i: integer;
    lr: leftRightType;
    r: Rect;
begin
  GetPenState(ps);
  PenNormal;
  PenMode(patBic);
  DrawBoxLines(box, true);
  EraseRect(box.boxRect);
  with box do
    for lr := left to right do
      for i := 0 to lineCount[lr] do
        with slotInfo[lr, i] do
          if (state = nameOK) or (state = nameNIL) then
            begin
              r := nameBox;
              OffsetRect(r, boxRect.left, boxRect.top);
              EraseRect(r);
            end;
  SetPenState(ps);
end;

procedure DrawBox; { (box : FlexRec; drawFrom : boolean) }
  var
    ps: PenState;
    i: integer;
    lr: leftRightType;
    r: Rect;
begin
  GetPenState(ps);
  PenNormal;
```

```
with box do
  begin
    TextBox(Ptr(ord4(@text) + 1), length(text), boxRect, teJustCenter);
    if not ison then
      begin
        PenSize(2, 2);
        PenPat(gray);
        FrameRoundRect(boxRect, ovWd, ovHt);
        PenNormal;
      end;
    FrameRoundRect(boxRect, ovWd, ovHt);
    PenSize(TabWidth, 2);
    for lr := left to right do
      for i := 0 to lineCount[lr] do
        begin
          if lr = left then
            moveto(boxRect.left, boxRect.top + i * 4 + 2)
          else
            moveto(boxRect.right - TabWidth, boxRect.top + i * 4 + 2);
          line(0, 0);
          with slotInfo[lr, i] do
            if (state = nameOK) or (state = nameNIL) then
              begin
                r := nameBox;
                OffsetRect(r, boxRect.left, boxRect.top);
                TextBox(Ptr(ord4(@name) + 1), length(name), r, teJustCenter);
                if state = nameNIL then
                  begin
                    PenSize(2, 2);
                    PenPat(gray);
                    FrameRoundRect(r, ovWd, ovHt);
                    PenNormal;
                  end;
              end;
        end;
     if selected then
       InvertRoundRect(boxRect, ovWd, ovHt);
   end;
  PenNormal;
  DrawBoxLines(box, drawFrom);
  SetPenState(ps);
end;

function BoundRect; { (box : FlexRec) : Rect }
{ Return the rectangle in local coordinates that bounds the box and all it's names. }
  var
    destRect: rect;
begin
  destRect := box.boundRect;
  OffsetRect(destRect, box.boxRect.left, box.boxRect.top);
  BoundRect := destRect;
end;
```

```
  function BandRect; { (box : FlexRec) : Rect }
{ Return the rect that bounds the box, it's names and it's rubber band lines. }
   var
     i: integer;
     r, r1: Rect;
     pt: Point;
     b: boolean;
  begin
    r := BoundRect(box);
    with box do
      for i := 0 to lineCount[left] do
        with slotInfo[left, i] do
          if (state = toFlex) or (state = toAbs) then
            begin
              SetPt(pt, boxRect.left - 1, boxRect.top + i * 4 + 2);
              Pt2Rect(FixPt, pt, r1);
              UnionRect(r, r1, r);
            end;
    for i := 0 to MaxFrm do
      with box.frmFlex[i] do
        if frmH <> nil then
          begin
            pt := SlotPoint(frmH^^, left, slot);
            Pt2Rect(pt, SlotPoint(box, right, toslot), r1);
            UnionRect(r, r1, r);
          end;
    BandRect := r;
  end;

  function DragBoxes (oldpt: Point): Point;
{ Drag all the boxes in the current selection list around  in the current grafport }
{ until the user lets up the mouse.  Return the difference of the new-old point. }
    var
      i: integer;
      ps: PenState;
      start, pt: point;
      dr: Rect;
      oldbox: FlexRec;
      fh: FlexHandle;
      pic: PicHandle;
      pi: PicInfoHandle;
    procedure FrameRects;
      var
        fh: FlexHandle;
        pi: PicInfoHandle;
    begin
      fh := SelecRoot;
      while fh <> nil do
        begin
          FrameBox(fh^^);             { draw new }
          fh := fh^^.nextSelH;
        end;
      pi := PicSelRoot;
```

```
    while pi <> nil do
      begin
        FrameRect(pi^^.bounds);
        pi := pi^^.nextsel;
      end;
  end;
begin
  start := oldpt;
  GetPenState(ps);
  PenPat(gray);
  PenSize(1, 1);
  PenMode(patXor);
  FrameRects;                    { Draw original }
  while StillDown do
    begin
      GetMouse(pt);
      if not equalPt(pt, oldpt) then
        begin
          pic := OpenPicture(FlexWPtr^.portRect);      { cashe old dashed lines. }
          FrameRects;
          ClosePicture;
          fh := SelecRoot;
          while fh <> nil do
            begin
              offsetRect(fh^^.boxRect, pt.h - oldpt.h, pt.v - oldpt.v);
              with fh^^ do
                for i := 0 to MaxFrm do
                  with frmFlex[i] do
                    if frmH <> nil then
                      frmH^^.slotInfo[left, slot].fixPt := SlotPoint(fh^^, right, toslot);
              fh := fh^^.nextSelH;
            end;
          pi := PicSelRoot;
          while pi <> nil do
            begin
              OffsetRect(pi^^.bounds, pt.h - oldpt.h, pt.v - oldpt.v);
              pi := pi^^.nextsel;
            end;
          FrameRects;                               { Draw new }
          DrawPicture(pic, FlexWPtr^.portRect);     { Erase old }
          KillPicture(pic);
        end;
      oldpt := pt;
    end;
  FrameRects;                                       { Erase final }
  SetPenState(ps);
  SubPt(start, oldpt);
  DragBoxes := oldpt;
end;

procedure SetLines (var box: FlexRec);
{ Set the location for the name boxes and rubberband lines based on whether a given }
{ I/O slot is toFlex or not. }
```

-000361

```
  var
    i, top, boxHeight: integer;
    lr: leftRightType;
    r: Rect;
    fi: FontInfo;
begin
  GetFontInfo(fi);
  boxHeight := fi.ascent + fi.descent + 2;
  with box do
    for lr := left to right do
      for i := 0 to lineCount[lr] do
        with slotInfo[lr, i] do
          begin
            top := i * (boxHeight + 5);
            top := top - ((lineCount[lr] div 2) * (boxHeight + 5));
            if (state = nameOK) or (state = nameNIL) then
              begin
                SetRect(r, 0, 0, 60, boxHeight);
                if lr = left then
                  begin
                    OffsetRect(r, -(r.right + 10), top);
                    SetPt(FixPt, r.right, top + boxHeight div 2);
                  end
                else
                  begin
                    OffsetRect(r, (boxRect.right - boxRect.left) + 10, top);
                    SetPt(FixPt, r.left - 1, top + boxHeight div 2);
                  end;
                nameBox := r;
                UnionRect(r, boundRect, boundRect);
              end;
          end;
end;

procedure ConnectLine (box1H: FlexHandle; slot1: integer; box2H: FlexHandle; slot2: integer);
{ Connect a line from box1, left, slot1 to box2, right, slot2. }
  var
    i: integer;
    found: boolean;
begin
  with box1H^^.slotInfo[left, slot1] do
    begin
      FixPt := SlotPoint(box2H^^, right, slot2);
      state := toFlex;
    end;
  found := false;
  with box2H^^ do
    for i := 0 to MaxFrm do
      if not found then
        if frmFlex[i].frmH = nil then
          begin
            frmFlex[i].frmH := box1H;
            frmFlex[i].slot := slot1;
```

-000362

```
          frmFlex[i].toslot := slot2;
          found := true;
        end;
  end;

  procedure MakeFlexBox; { (var dm : DMRec; saveSelect: boolean) }
{ Fill the FlexRec pointed to by dm.flexH^^ with values based on this DM.  If }
{ dm.flexH is nil then allocate memory for it, else reuse the existing memory. }
    var
      i: integer;
      SixName: string;
  begin
    SixName := 'xyzYPR';
    if dm.flexH <> nil then
      if GetHandleSize(Handle(dm.FlexH)) <> sizeof(FlexRec) then
        dm.flexH := nil;
    if dm.FlexH = nil then
      begin
        dm.FlexH := FlexHandle(NewHandle(sizeof(FlexRec)));
        saveSelect := false;
      end;
    if dm.FlexH <> nil then
      begin
        HLock(Handle(dm.FlexH));
        with dm, dm.FlexH^^ do
          begin
            SetRect(boxRect, 0, 0, 80, 25);
            OffsetRect(boxRect, visLoc.h, visLoc.v);
            boundRect := boxRect;
            OffsetRect(boundRect, -boxRect.left, -boxRect.top);
            text := concat(name, chr(13), DMTypes[typeIdx].name);
            ison := (state = on);
            dmLines := not noLines;
            if not saveSelect then
              selected := false;
            nextSelH := nil;
            LineCount[left] := inputs - 1;
            lineCount[right] := outputs - 1;
            for i := 0 to lineCount[left] do
              with slotInfo[left, i] do
                begin
                  if true then
                    name := SlotName(SlotsIn[i])
                  else
                    begin
                      name := SlotsIn[i].name;
                      if SlotsIn[i].kind = frmTree then
                        if length(name) <> 0 then
                          name := concat(SixName[SlotsIn[i].inIdx + 1], '-', name);
                    end;
                  if (SlotsIn[i].kind = frmDM) and dmLines then
                    begin
                      if SlotsIn[i].ptrfrm <> nil then
```

```
                state := toFlex
              else
                state := nada;
            end
          else if length(name) <> 0 then
            begin
              if SlotsIn[i].ptrfrm <> nil then
                state := nameOK
              else
                state := nameNIL;
            end
          else
            state := nada;
        end;
      for i := 0 to lineCount[right] do
        with slotInfo[right, i] do
          begin
            name := PointsOut[i].name;
            if length(name) = 0 then
              state := nada
            else if PointsOut[i].ptrto <> nil then
              state := nameOK
            else
              state := nameNIL;
            if length(name) <> 0 then
              name := concat(SixName[ord(PointsOut[i].SixAxis) + 1], '-', name);
          end;
      SetLines(dm.flexH^^);
      for i := 0 to MaxFrm do
        frmFlex[i].frmH := nil;
    end;
  end;
end;        { MakeFlexBox }

procedure MakeFlexLines; { (var dm : DMRec) }
{ Play connect the dots.  Connect all the ruberband type lines that go from this }
{ dm to others. }
  var
    i, j: integer;
begin
  if dm.flexH <> nil then
    with dm, dm.FlexH^^ do
      begin
        for i := 0 to inputs - 1 do
          if (SlotsIn[i].kind = frmDM) and dmLines then
            with SlotInfo[left, i] do
              begin
                j := FindDM(SlotsIn[i].name, true);
                if j < 0 then
                  state := nada
                else if DMRecsPtr^[j].FlexH = nil then
                  state := nada
                else
```

```
              state := toFlex;
            if state = toFlex then
              ConnectLine(dm.FlexH, i, DMRecsPtr^[j].FlexH, SlotsIn[i].inIdx);
          end;
      end;
  end;

  procedure MakeAllLines;
{ Remake where all the rubber band lines go. }
    var
      i, j: integer;
  begin
    for i := 0 to numOfDMRec do          { First nil out all the existing lines. }
      if DMRecsPtr^[i].flexH <> nil then
        with DMRecsPtr^[i].flexH^^ do
          begin
            j := 0;
            while (frmFlex[j].frmH <> nil) and (j <= MaxFrm) do
              begin
                frmFlex[j].frmH := nil;
                j := j + 1;
              end;
          end;
    for i := 0 to numOfDMRec do          { and then make new ones. }
      MakeFlexLines(DMRecsPtr^[i]);
  end;

  function PicSelected (pic: PicInfoHandle): boolean;
    { Return true if this pic is currently selected. }
    var
      i: integer;
      pi: PicInfoHandle;
  begin
    PicSelected := false;
    pi := PicSelRoot;
    while pi <> nil do
      begin
        if pi = pic then
          begin
            PicSelected := true;
            leave;
          end;
        pi := pi^^.nextsel;
      end;
  end;

{ Draw all the DM's in the flex window that intersect with the given rectangle. }
{ Do this in two passes. The first pass draws DM's that aren't selected. The second }
{ pass draws the ones that are selected. That way the selected ones always appear }
{ to be on the top. }

  procedure DrawIn (r: Rect);
    var
```

```
    i: integer;
    dstRect: Rect;
  begin
   { First, draw all the lines leaving from the left side of boxes. }
   for i := numOfDMRec downto 0 do
    with DMRecsPtr^[i] do
     if flexH <> nil then
      DrawLeftLines(flexH^^);
   { Now draw all the boxes that aren't selected and intersect the given rect. }
   for i := numOfDMRec downto 0 do
    with DMRecsPtr^[i] do
     if flexH <> nil then
      if not flexH^^.selected then
       if SectRect(r, BoundRect(flexH^^), dstRect) then
        DrawBox(flexH^^, false);
   { Last, draw all the boxes that are selected and intersect the given rect. }
   for i := numOfDMRec downto 0 do
    with DMRecsPtr^[i] do
     if flexH <> nil then
      if flexH^^.selected then
       if SectRect(r, BoundRect(flexH^^), dstRect) then
        DrawBox(flexH^^, false);
  end;

{ #d = date, #p = page, #f = filename, #t = time. }
  function ExpandStr (instr: string; page: integer; var just: integer): string;
   const
    leadChar = '#';
   var
    i: integer;
    outstr: string;
    str: Str255;
    secs: LongInt;
  begin
   just := teJustRight;
   outstr := '';
   i := pos(leadChar, instr);
   while i <> 0 do
    begin
     Insert(copy(instr, 1, i - 1), outstr, 255);
     case instr[i + 1] of
      'p', 'P':
       outstr := StringOf(outstr, page : 1);
      'f', 'F':
       if CrntfName[dmFile] = '' then
        Insert('Untitled', outstr, 255)
       else
        Insert(CrntfName[dmFile], outstr, 255);
      'd', 'D':
       begin
        GetDateTime(secs);
        IUDateString(secs, abbrevDate, str);
        Insert(str, outstr, 255);
```

-000366

```
          end;
        't', 'T':
          begin
            GetDateTime(secs);
            IUTimeString(secs, false, str);
            Insert(str, outstr, 255);
          end;
        'l', 'L':
          just := teJustLeft;
        'c', 'C':
          just := teJustCenter;
        'r', 'R':
          just := teJustRight;
        leadChar:
          outstr := concat(outstr, leadChar);
      end;       { case }
      Delete(instr, 1, i + 1);
      i := pos(leadChar, instr);
    end;
  ExpandStr := concat(outstr, instr);
end;

function GetStrRes (id: integer): Str255;
  { Return a string that is the 'STR ', id resource in the current resFile or }
  { if none is there return nil. }
  var
    h: StringHandle;
begin
  h := GetString(id);
  if h = nil then
    GetStrRes := ''
  else
    GetStrRes := h^^;
end;

procedure DrawHeaderFooter (rPage: Rect; page: integer);
  var
    r: Rect;
    str: string;
    finfo: FontInfo;
    just: integer;
begin
  GetFontInfo(finfo);
  with rPage, finfo do
    SetRect(r, left + 5, top + 5, right - 5, top + 5 + ascent + descent + leading + 2);
  str := ExpandStr(GetStrRes(HeadID), page, just);
  TextBox(Ptr(ord4(@str) + 1), length(str), r, just);
  with rPage, finfo do
    SetRect(r, left + 5, bottom - (5 + finfo.ascent + finfo.descent + leading + 2), right - 5, bottom - 5);
  str := ExpandStr(GetStrRes(FootID), page, just);
  TextBox(Ptr(ord4(@str) + 1), length(str), r, just);
end;
```

```
  procedure BackGround (drawRect: Rect; drawPage: boolean);
{ Draw whatever background is appropriate behind the Flex boxes. }
{ That includes any Pictures in the drawRect, the page headers and footers. }
{ If drawPage is true then draw dashed lines for where the page breaks go. }
    var
      i, j, horzPage, vertPage, pagenum: integer;
      total, r, dstRect: Rect;
      pInfo: TPrInfo;
      pic: PicHandle;
      pi: PicInfoHandle;
  begin
    total := totalBound;
    OffsetRect(total, -total.left, -total.top);
    if PrintStuff <> nil then
      begin
        pInfo := PrintStuff^^.prInfo;
        with pInfo do
          begin
            horzPage := (total.right - total.left) div rPage.right + 1;
            vertPage := (total.bottom - total.top) div rPage.bottom + 1;
            if drawPage then
              begin      { Draw dashed grey lines for the page breaks. }
                PenPat(gray);
                for i := 1 to horzPage do
                  begin
                    moveto(totalBound.left + i * rPage.right, -16000);
                    line(0, 32000);
                  end;
                for i := 1 to total.bottom div rPage.bottom + 1 do
                  begin
                    moveto(-16000, totalBound.top + i * rPage.bottom);
                    line(32000, 0);
                  end;
                PenPat(black);
              end;
            pagenum := 1;                        { Draw header and footer strings on each page. }
            for i := 0 to horzPage - 1 do
              for j := 0 to vertPage - 1 do
                begin
                  r := rPage;
                  offsetRect(r, i * rPage.right + totalBound.left, j * rPage.bottom + totalBound.top);
                  if SectRect(drawRect, r, dstRect) then
                    DrawHeaderFooter(r, pagenum);
                  pagenum := pagenum + 1;
                end;
          end;
      end;
    pi := PicRoot;
    while pi <> nil do
      begin
        r := pi^^.bounds;
        if SectRect(drawRect, r, dstRect) then
          begin
```

-000368

```
            pic := pi^^.pic;
            if pic^ = nil then
              LoadResource(Handle(pic));
            HLock(Handle(pic));
            DrawPicture(pic,  r);
            HUnLock(Handle(pic));
            if PicSelected(pi) then
              FrameRect(r);
          end;
        pi := pi^^.next;
      end;
  end;

end.
```

```
unit forExScript;

interface
  uses
    ChuckStuff, Globals, Tree3DGlob, fastStuff, Tree3D, formTree3D, DMTypes, DMGlobals, {}
    datamassage, FileIO, ScriptGlob, ScriptParse;

  procedure Assign (param: paramRec; newInt: integer; newStr: string; newTok: Token);
  procedure SetEditPt (name: nameStr);
  procedure doChangePt (name: nameStr; six, new: integer);
  procedure doGetPt (param: paramRec; name: nameStr; six: integer);
  procedure doSetVol (volName: string);
  procedure doOpen (who, name: str255);
  procedure tryMenu (param: paramRec; itemName: str255);
  procedure doMenuCheck (param1, param2: paramRec; itemName: string);
  procedure doSetItemMark (param1: paramRec; itemName: string; markParam: paramRec);
  procedure doMenuOn (param1, param2: paramRec; itemName: string);
  procedure doHookIn (var params: paramArray);
  procedure doGetInDM (var params: paramArray);
  procedure doGetOutDM (var params: paramArray);

implementation

  procedure Assign;
    { Assign the value in either newStr or newInt to the variable in ints[index]. }
    { params[pnum] is a varable, but it might be an int or a string. }
    var
      l: longInt;
  begin
    if not (newTok in strToks + intToks) then
      gv.errStr := 'illegal assignment'
    else
      begin
        if newTok in strToks then
          begin
            StringtoNum(newStr, l);
            newInt := integer(l);
          end
        else
          newStr := ntos(newInt);
        with param do
          if tok = strVar then
            gv.strs[idx] := newStr
          else
            gv.ints[idx] := newInt;
      end;
  end;    { Assign }

  procedure SetEditPt; {(name : nameStr) }
    var   { If the node named 'name' exists, set the current edit pt to it. }
      p: PRecPtr;
  begin
    p := FindTreeName(maintreeptr, name);
```

```
    maintreeptr^.edPtr := p;
  end;

  procedure doChangePt; { (name : nameStr; six, new : integer) }
{ params[1] is  point name, params[2].int is }
{ sixAxis, params[3] is new value.  Set new value. }
    var
      p: PRecPtr;
  begin
    p := FindTreeName(maintreeptr, name);
    SetSixth(p, six, new);
  end;    { doChangePt }
  procedure doGetPt; { (param : paramRec; name : nameStr; six : integer) }
    var
      p: PRecPtr;
      i: integer;
  begin
    p := FindTreeName(maintreeptr, name);
    i := GetSixth(p, six);
    if six >= 3 then
      begin
        if i > 1800 then
          i := i - 3600;
      end;
    Assign(param, i, '', litInt);
  end;


  procedure doSetVol; { (volName : string) }
    var
      wpb: WDPBRec;
      err: integer;
  begin
    with wpb do
      begin
        ioNamePtr := @volName;
        ioVRefNum := 0;
        ioWDDirID := 0;
        ioWDProcID := 45;
      end;
    err := PBOpenWD(@wpb, false);
    if err = noErr then
      err := SetVol(nil, wpb.ioVRefNum);
    if err <> 0 then
      gv.errStr := concat('SetVol error #', ntos(err), '.');
  end;

  procedure doOpen; { (who, name : nameStr) }
    var
      ft: FileType;
  begin
    lowcase(who);
    if who = 'dm' then
```

```
    ft := dmFile
  else if who = 'tree' then
    ft := treeFile
  else
    gv.errStr := 'Illegal parameter';
  if gv.errStr = '' then
    if OpenFile(0, name, ft) <> 0 then
      gv.errStr := concat('Open of ''', name, ''' failed');
end;    { doOpen }

function FindInMenu (mh: menuHandle; itemName: str255; var item: integer): boolean;
{ Try to find the given item in the given menu.  return true and item number }
{ if found. }
  var
    flag: boolean;
    str:  str255;
begin
  item := CountMItems(mh);
  flag := false;
  repeat
    GetItem(mh, item, str);
    lowcase(str);
    if str = itemName then
      flag := true
    else
      item := item - 1;
  until (item < 1) or flag;
  FindInMenu := flag;
end;

function FindMenu (param: ParamRec; itemName: str255; var mh: MenuHandle; var item: integer):
      boolean;
{ try to find this menu/item combination.  If found return the handle/itemnum. }
  type
    menuListHandle = ^menuListPtr;
    menuListPtr = ^menuListType;
    menuListType = record
        offset, horz, unused: integer;
        menus: array[1..1000] of record
            mhand: MenuHandle;
            leftEdge: integer;
          end;
      end;
  var
    mlist: menuListHandle;
    mnum, menuID: integer;
    menuName, str: str255;
    found: boolean;
begin
  if param.tok in intToks then
    menuID := param.int
  else
    begin
```

```
      menuID := 0;
      menuName := param.str;
      lowcase(menuName);
    end;
  lowcase(itemName);
  found := false;
  mnum := 1;      { Search my menu list first so duplicate menu's will hit here. }
  while (myMenuList[mnum] <> nil) and not found do
    begin
      mh := myMenuList[mnum];
      if menuID <> 0 then
        found := (mh^^.menuID = menuID)
      else
        begin
          str := mh^^.menuData;
          lowcase(str);
          found := (str = menuName);
        end;
      if found then
        found := FindInMenu(mh, ItemName, item);
      mnum := mnum + 1;
    end;
  if not found then
    begin  { not found in the my list, Search the visible list. }
      if menuID <> 0 then
        begin
          mh := GetMHandle(menuID);
          if mh <> nil then
            found := FindInMenu(mh, ItemName, item);
        end
      else
        begin
          mlist := menuListHandle(GetMenuBar);
          mnum := mlist^^.offset div 6;
          repeat
            mh := mlist^^.menus[mnum].mhand;
            str := mh^^.menuData;
            lowcase(str);
            if (str = menuName) then
              found := FindInMenu(mh, ItemName, item);
            if not found then
              mnum := mnum - 1;
          until found or (mnum < 1);
          DisposHandle(handle(mlist));
        end;
    end;
  FindMenu := found;
end;

  procedure tryMenu; { (param: ParamRec; itemName : str255) }
{ try to find this menu/item combination.  If found execute the menu, return }
{ errStr = '' else return error in errStr. }
    var
```

```
    mh: MenuHandle;
    i: integer;
  begin
   if FindMenu(param, itemName, mh, i) then
     begin
      executeMenu(mh^^.menuID, i);
      AcquireRefresh;
     end
   else
     gv.errStr := 'Menu/Item not found.';
  end;

  procedure doMenuCheck; {•(param1,param2 : paramRec;•}
                         {•       itemName : string);•}
{ mChecked <ivar> <menuname> <itemname> }
{ Set the integer variable to true if the menu item is currently checked. }
   var
    mh: MenuHandle;
    i, item: integer;
    markChar: char;
  begin
   if FindMenu(param2, itemName, mh, item) then
     begin
      GetItemMark(mh, item, markChar);
      Assign(param1, ord(markChar), '', litInt);
     end
   else
     gv.errStr := 'Menu/Item not found.';
  end;

  procedure doSetItemMark; {•(param1:paramRec;  itemName : string; markParam: paramRec);•}
{ MarkMenu menuname itemname markChar }
{ Mark the menu with the given character. }
{ Set the integer variable to true if the menu item is currently checked. }
   var
    mh: MenuHandle;
    i, item: integer;
    markChar: char;
  begin
   if markParam.tok in strToks then
     markParam.int := ord(markParam.str[1]);
   if FindMenu(param1, itemName, mh, item) then
     begin
      SetItemMark(mh, item, char(markParam.int));
     end
   else
     gv.errStr := 'Menu/Item not found.';
  end;

  procedure doMenuOn; {•(param1, param2 : paramRec;•}
                      {•       itemName : string);•}
{ menuOn <ivar> <menuname> <itemname> }
{ Set the integer variable to true if the menu item is currently not dimmed. }
```

-000374

```
    var
      mh: MenuHandle;
      i, item: integer;
      markChar: char;
  begin
    if FindMenu(param2, itemName, mh, item) then
      begin
        i := BitShift(1, item);
        if BitAnd(mh^^.enableFlags, 1 + i) = 1 + i then
          i := 1
        else
          i := 0;
        Assign(param1, i, '', litInt);
      end
    else
      gv.errStr := 'Menu/Item not found.';
  end;

  procedure doHookIn;{(var params : paramArray) }
{ Set the DM input # inidx to the given parameters. }
{ setDMIn <$dmname> <%inidx> raw|tree|dm <$inName> <$SixName>|<%idx> }
    var
      i: integer;
      frmT: inputKind;
  begin
    lowcase(params[3].str);
    i := -1;
    if params[3].str = 'raw' then
      begin
        frmT := frmRaw;
        i := 0;
      end
    else if params[3].str = 'dm' then
      begin
        frmT := frmDM;
        if not (params[5].tok in intToks) then
          gv.errStr := 'Illegal parameter.'
        else
          i := params[5].int - 1;
      end
    else if params[3].str = 'tree' then
      begin
        frmT := frmTree;
        if params[5].tok in intToks then
          begin
            i := params[5].int;
            if (i < 0) or (i > 5) then
              gv.errStr := 'Not Six Axis Index.';
          end
        else if (params[5].tok in strToks) then
          begin
            i := strIsSix(params[5].str);
            if i < 0 then
```

-000375

```
          gv.errStr := 'Not Six Axis type.';
        end
      else
        gv.errStr := 'Illegal parameter.'
    end;
   if (gv.errStr = '') then
     if not SetDMIO(true, params[1].str, params[4].str, frmT, params[2].int, i) then
       gv.errStr := 'hookupInput didn''t work.';
  end;

  procedure doGetInDM; {(var params : paramArray) }
{ get the current Input for this DM. Parameters have all been checked out. }
{ getdmin <dmname> <inIndex> <$inKind> <$inName> <%inInt> }
   var
     str: string;
  begin
   with DMRecsPtr^[params[1].int] do
     begin
      if params[2].int > inputs then
        gv.errStr := 'Invalid input'
      else
        with SlotsIn[params[2].int - 1] do
          begin
            Assign(params[4], 0, name, litStr);
            case kind of
              frmDM:
                str := 'DM';
              frmRaw:
                str := 'Raw';
              frmTree:
                str := 'Tree';
            end;{ case }
            Assign(params[3], 0, str, litStr);
            Assign(params[5], inIdx + 1, '', litInt); { 4/28/88 - turn 0.. into 1.. }
          end;
     end;
  end;

  procedure doGetOutDM; {(var params : paramArray) }
{ get the current Output for this DM. Parameters have all been checked out. }
{ getdmin <dmname> <outIndex> <$outName> <$outSix> }
   var
     str: string;
  begin
   with DMRecsPtr^[params[1].int] do
     begin
      if params[2].int > outputs then
        gv.errStr := 'Invalid output'
      else
        with PointsOut[params[2].int - 1] do
          begin
            Assign(params[3], 0, name, litStr);
            str := SixAxisName(SixAxis);
```

```
            Assign(params[4], 0, str, litStr);
          end;
     end;
  end;     { doGetOutDM }

end.
```

-000377

04/22/90 18:35 formTree.pas Page 1

```
{ DataSuit Tree Rendering, Editing and Transversing procedures. }

{  By Chuck Blanchard,  7/13/87}
{  Copyright 1985 VPL Research, Inc.  All rights reserved}

{Tree procedures }

unit formTree3D;

interface

 uses
   ChuckStuff, AutoLib, FastStuff, Globals, Tree3DGlob, MiscRoutines;

 type

   bigSinTableType = array[0..899] of integer;
   bigSinTablePtr = ^bigSinTableType;

 var
   screenH, screenV: integer;
   perspective: boolean;
   ZeeZoom: integer;
   bsinPtr: bigSinTablePtr;

 procedure DisposeIt (trp: TreeRecPtr; p: PRecPtr);

 procedure SetDefaultMinMax (p: PRecPtr);

 function fFindTreeName (trp: TreeRecPtr;     { Find the named point rec. }
             n: nameStr): PRecPtr;

 function nDispPt (var p3: Point3D): Point;
 function PRecName (p: PRecPtr): nameStr;

 function PtrtoL (trp: TreeRecPtr; p: PRecPtr): longInt;
 function PtrtoIdx (trp: TreeRecPtr; p: PRecPtr): PRecPtr;
 function IdxtoPtr (trp: TreeRecPtr; p: PRecPtr): PRecPtr;

 procedure Rot (var a, b: Integer; theta: integer);
 procedure Convert (p: PRecPtr);
 procedure DirtyConvert (p: PRecPtr);
 procedure unConvert (origp: PRecPtr);
 procedure dirtyTreeWalk (p: PRecPtr; d: boolean);
 procedure PreFixTreeWalk (p: PRecPtr; procedure proc (p: PRecPtr));
 procedure InFixTreeWalk (p: PRecPtr; procedure proc (p: PRecPtr));
 procedure PostFixTreeWalk (p: PRecPtr; procedure proc (p: PRecPtr));

 procedure MakeGarbageList (trp: TreeRecPtr);
 function InsertPt (trp: TreeRecPtr; glob: boolean; parent: PRecPtr; x, y, z: Integer; r, p, yw: integer;
      rbool, dbool: boolean; newName: string): PRecPtr;
 function InsertCopyofPt (trp: TreeRecPtr; parent, origPt: PRecPtr): PRecPtr;
 procedure CheckTree (trp: TreeRecPtr; CleanOut: Boolean);
```

```
  procedure fNewTree (trp: TreeRecPtr);

  procedure TreeClear (trp: TreeRecPtr);
  procedure CopySubTree (source, dest: TreeRecPtr);

  procedure Circleize (parPtr: PRecPtr; radius: integer);
{ Add a new point off of the current edit point and make it the new edit point. }
  procedure TreeAddPoint (trp: TreeRecPtr; down, doline: boolean);
  procedure TreeAddObj (trp: TreeRecPtr);

  procedure SetSixth (p: PRecPtr; sixIdx, newvalue: integer);
  function GetSixth (p: PRecPtr; sixIdx: integer): integer;
  procedure ConstrainPt (p: PRecPtr);

implementation

  const
    doCheck = true;

  var
    lastSine, lastCosine: integer;

{--------------------------------------------------------------------}
{          68000 subroutines found in FastStuff.a                     }
{--------------------------------------------------------------------}

  procedure BigRotate (var pt: Point3d; t: RotTrip);
  EXTERNAL;
  procedure BigUnrotate (var pt: Point3d; t: RotTrip);
  EXTERNAL;

{--------------------------------------------------------------------}
{          Pascal subroutines                                         }
{--------------------------------------------------------------------}

  procedure SetDefaultMinMax;  { (p : PRecPtr) }
    var       { Set the default min and max values for position and orientation. }
      i: integer;
  begin
    with p^ do
      begin
        for i := 0 to 2 do
          begin
            mins.s[i] := -20000;
            maxs.s[i] := 20000;
            mins.s[i + 3] := 0;
            maxs.s[i + 3] := 3599;
          end;
        bound.minPt.x := 0;
        bound.minPt.y := 0;
        bound.minPt.z := 0;
        bound.maxPt.x := 0;
        bound.maxPt.y := 0;
```

```
      bound.maxPt.z := 0;
    end;
  end;

  procedure NewIt (trp: TreeRecPtr; var p: PRecPtr);
    var
      i: integer;
      h: Handle;
  begin  { return p pointing to a new record. }
    with trp^ do
      begin
        for i := 1 to MaxStorage do
          if Storage[i] = nil then
            begin
              h := Pointer(NewHandle(sizeof(PointRec)));
              if h = nil then
                Announce(StringOf('NewIt: Can"t allocate memory for a tree point, ResError = ', ResError :
        1))
              else
                begin
                  MoveHHi(h);
                  HLock(h);
                  p := Pointer(StripAddress(h^));
                  Storage[i] := p;
                end;
              leave;
            end;
      end;
    SetDefaultMinMax(p);
  end;

  procedure DisposeIt (trp: TreeRecPtr; p: PRecPtr);
{ Add this PointRec to the garbage list. }
    var
      i: integer;
      h: Handle;
  begin
    i := PtrtoL(trp, p);
    if i > 0 then
      begin
        h := RecoverHandle(Pointer(trp^.Storage[i]));
        if h <> nil then
          DisposHandle(h);
        trp^.Storage[i] := nil;
      end;
  end;


{ This is only called by nDispPt but is not inside nDispPt because of a bug in the LSP 2.0 compiler }
  function persp (zratio, coord, shift: integer): integer;
  inline
    $321F,      { move.w (a7)+,d1      ; shift        }
    $301F,      { move.w (a7)+,d0      ; x or y       }
```

```
    $48C0,        { ext.l     d0          }
    $E3A8,        { lsl.l     d1,d0       }
    $321F,        { move.w  (a7)+,d1        ; z ratio      }
    $81C1,        { divs      d1,d0         ; div i          }
    $3E80;        { move.w  d0,(sp)    }

  function nDispPt; { (var p3 : Point3D) : Point }
    var
      p: Point;{ convert a 3d point into a 2d point to display. }
      i:  integer;

  begin
{$ifc true }
    if perspective then
      i := 1024 + p3.z + ZeeZoom
    else
      i := 1024 + ZeeZoom;
    if i = 0 then
      begin
        p.h := screenH;
        p.v := screenV;
      end
    else
      begin
        p.h := persp(i, p3.x, 10) + screenH;
        p.v := persp(i, p3.y, 10) + screenV;
      end;
{$elsec }
    if perspective then
      begin
        i := 1024 + p3.z + ZeeZoom;
        if i = 0 then
          begin
            p.h := screenH;
            p.v := screenV;
          end
        else if true then
          begin
            p.h := persp(i, p3.x, 10) + screenH;
            p.v := persp(i, p3.y, 10) + screenV;
          end
        else
          begin
            p.h := lslL(p3.x, 10) div i + screenH;
            p.v := lslL(p3.y, 10) div i + screenV;
          end;
      end
    else
      begin
        p.h := p3.x + screenH;
        p.v := p3.y + screenV;
      end;
{$endc }
```

```
    nDispPt := p;
  end;

{ Return the name of this point rec. }
  function PRecName; { (p : PRecPtr) : namestr }
    var
      str: string;
      p1: PRecPtr;
  begin
    if p^.name <> '' then
      PRecName := p^.name
    else
      begin
        str := concat(PRecName(p^.up), 'D');
        p1 := p^.up^.down;
        while p1 <> p do
          begin
            str := concat(str, 'R');
            p1 := p1^.right;
          end;
        PRecName := str;
      end;
  end;

  function StripPRecPtr (p: PRecPtr): PRecPtr;
  begin
    StripPRecPtr := PRecPtr(StripAddress(Ptr(p)));
  end;

  function PtrtoL; { (trp : TreeRecPtr; p : PRecPtr) : longInt }
{ Change this pointer to a index into the storage array for this tree record. }
    var
      i: integer;
      l1, l2: longint;
  begin
    if p = nil then
      PtrtoL := 0
    else
      begin
        PtrtoL := -1;
        for i := 1 to MaxStorage do
          if trp^.storage[i] = p then
            begin
              PtrtoL := i;
              leave;
            end;
      end;
  end;

  function PtrtoIdx; { (trp : TreeRecPtr; p : PRecPtr) : PRecPtr }
{ Change this pointer to a index into the storage array for this tree record. }
  begin
    PtrtoIdx := PRecPtr(PtrtoL(trp, p));
```

```
end;

function IdxtoPtr; { (trp : TreeRecPtr; p : PRecPtr) : PRecPtr }
  var
    l1, l2: longint;
begin
  if p = nil then
    IdxtoPtr := nil
  else
    begin
      l1 := ord4(p);
      if (l1 < 1) or (l1 > MaxStorage) then
        IdxtoPtr := nil
      else
        IdxtoPtr := StripPRecPtr(trp^.storage[ord4(p)]);
    end;
end;    { IdxtoPtr }

procedure Rot; {(var a, b: Integer; theta: integer)}
  var
    a1, b1: LongInt;
    sinIdx, cosIdx, sinSign, cosSign, quad: integer;
begin
  a1 := a;
  b1 := b;
  quad := theta div 900;
  case quad of
    0:        { 0 <= theta < 900 }
      begin
        sinIdx := theta;
        sinSign := 1;
        cosIdx := 899 - theta;
        cosSign := 1;
      end;
    1:        { 900 <= theta < 1800 }
      begin
        sinIdx := 1799 - theta;
        sinSign := 1;
        cosIdx := theta - 900;
        cosSign := -1;
      end;
    2:        { 1800 <= theta < 2700 }
      begin
        sinIdx := theta - 1800;
        sinSign := -1;
        cosIdx := 2699 - theta;
        cosSign := -1;
      end;
    3:        { 2700 <= theta < 3600 }
      begin
        sinIdx := 3599 - theta;
        sinSign := -1;
        cosIdx := theta - 2700;
```

```
      cosSign := 1;
    end;
  end;  { case }
  a := (a1 * (bsinPtr^[cosIdx] * cosSign) - b1 * (bsinPtr^[sinIdx] * sinSign) + 512) div 1024;
  b := (a1 * (bsinPtr^[sinIdx] * sinSign) + b1 * (bsinPtr^[cosIdx] * cosSign) + 512) div 1024;
end;

procedure unusedRot (var a, b: Integer; theta: integer);
  var
    a1, b1: LongInt;
    sinIdx, cosIdx, sinSign, cosSign, quad: integer;
begin
  a1 := a;
  b1 := b;
  quad := theta div 900;
  case quad of
    0:      { 0 <= theta < 900 }
      begin
        sinIdx := theta;
        sinSign := 1;
        cosIdx := 899 - theta;
        cosSign := 1;
      end;
    1:      { 900 <= theta < 1800 }
      begin
        sinIdx := 1799 - theta;
        sinSign := 1;
        cosIdx := theta - 900;
        cosSign := -1;
      end;
    2:      { 1800 <= theta < 2700 }
      begin
        sinIdx := theta - 1800;
        sinSign := -1;
        cosIdx := 2699 - theta;
        cosSign := -1;
      end;
    3:      { 2700 <= theta < 3600 }
      begin
        sinIdx := 3599 - theta;
        sinSign := -1;
        cosIdx := theta - 2700;
        cosSign := 1;
      end;
  end;  { case }
  lastSine := bsinPtr^[sinIdx] * sinSign;
  lastCosine := bsinPtr^[cosIdx] * cosSign;
  a := (a1 * (lastCosine) - b1 * (lastSine) + 512) div 1024;
  b := (a1 * (lastSine) + b1 * (lastCosine) + 512) div 1024;
end;

procedure pRotate (var pt: Point3d; t: RotTrip);
  { Rotate this point by the given translation triplicate. }
```

```
 begin
  with pt, t do
   begin
    if roll <> 0 then
     Rot(x, y, roll);
    if pitch <> 0 then
     Rot(y, z, pitch);
    if yaw <> 0 then
     Rot(x, z, yaw);
   end;
 end; { Rotate } .

 procedure Add3Pt (var p1: Point3D; p2: Point3D);
{ Add two points and leave the result in the first point. Hand coded for speed. }
 inline
  $205F,          { move.l  (a7)+,a0     a0 = frm point addr. }
  $225F,          { move.l  (a7)+,a1     a1 = to point addr.  }
  $3018,          { move.w  (a0)+,d0     get frm.x }
  $D159,          { add.w   d0,(a1)+     add to to.x }
  $3018,          { move.w  (a0)+,d0     get frm.y }
  $D159,          { add.w   d0,(a1)+     add to to.y }
  $3018,          { move.w  (a0)+,d0     get frm.z }
  $D159;          { add.w   d0,(a1)+     add to to.z }


 procedure Convert; {(p : PRecPtr)}
  var        { Convert this particular point to global coorinates. }
   tp: PRecPtr;

 begin
  tp := p^.up;
  p^.gPt := p^.lSix.pt;
  while tp <> nil do
   begin
    BigRotate(p^.gPt, tp^.lSix.tt);
    Add3Pt(p^.gPt, tp^.lSix.pt);
    tp := tp^.up;
   end;
 end; { Convert }

 procedure DirtyConvert (p: PRecPtr);
  { If this point is dirty, or any of it's parents are dirty then convert }
  { it to global coordinates. }
  var
   tp: PRecPtr;
 begin
  tp := p;
  while tp <> nil do
   begin
    if tp^.dirty then
     begin
      Convert(p);
      leave;
```

```
      end;
     tp := tp^.up;
    end;
  end;

  procedure unConvert; {(origp : PRecPtr)}
{ given a point in global coordinates, convert the points local coordinates to }
{ match, in local world, the global coordinates. }
   var
    tp: PRecPtr;

   procedure unRotate (var pt: Point3d; t: RotTrip);
   { Rotate this point by the given translation triplicate. }
   begin
    with pt, t do
     begin
      if yaw <> 0 then
       Rot(x, z, degrange(-yaw));
      if pitch <> 0 then
       Rot(y, z, degrange(-pitch));
      if roll <> 0 then
       Rot(x, y, degrange(-roll));
     end;
   end; { unRotate }

   procedure doit (p: PRecPtr);
    var
     tpt: Point3d;
   begin
    if p^.up <> nil then
     doit(p^.up);
    tpt := p^.lSix.pt;
    with tpt do
     begin
      x := -x;
      y := -y;
      z := -z;
     end;
    Add3Pt(origp^.lSix.pt, tpt);
    BigUnrotate(origp^.lSix.pt, p^.lSix.tt);
   end;

  begin
   origp^.lSix.pt := origp^.gPt;
   doit(origp^.up);
   origp^.dirty := true;
   origp^.SGldirty := true;
  end; { unConvert }

  procedure MinMax3D (src: Point3d; var destMin, destMax: Point3d);
  begin
   with destMax do
    begin
```

```
      x := maxOf(x, src.x);
      y := maxOf(y, src.y);
      z := maxOf(z, src.z);
    end;
  with destMin do
    begin
      x := minOf(x, src.x);
      y := minOf(y, src.y);
      z := minOf(z, src.z);
    end;
end;

procedure dirtyTreeWalk; { (p : PRecPtr; d : boolean) }
  { walk all over the tree and convert each point to global world }
  { coordinates if this point or an ancestor of it was dirty. }
  var
    d1: boolean;
begin
  repeat
    d1 := d or p^.dirty;
    p^.Changed := d1;
    if p^.down <> nil then
      begin
        dirtyTreeWalk(p^.down, d1);
      end;
    if d1 then
      begin
        Convert(p);
        p^.dirty := false;
      end;
    p := p^.right;
  until p = nil;
end; { dirtyTreeWalk }

procedure PreFixTreeWalk (p: PRecPtr; procedure proc (p: PRecPtr));
  { Traverse the tree calling the given procedure at the first occurance of a node. }
begin
  if p <> nil then
    begin
      proc(p);
      PreFixTreeWalk(p^.down, proc);
      PreFixTreeWalk(p^.right, proc);
    end;
end; { PreFixTreeWalk }

procedure InFixTreeWalk;
{• procedure InFixTreeWalk (p : PRecPtr;•}
{•     procedure proc (p : PRecPtr));•}
  { walk all over the tree and convert each point to global world }
  { coordinates. }
begin
  if p <> nil then
    begin
```

```
      InFixTreeWalk(p^.down, proc);
      proc(p);
      InFixTreeWalk(p^.right, proc);
    end;
  end; { InFixTreeWalk }

  procedure PostFixTreeWalk;
{•  procedure PostFixTreeWalk (p : PRecPtr;•}
{•      procedure proc (p : PRecPtr));•}
    { walk all over the tree and convert each point to global world }
    { coordinates. }
  begin
    if p <> nil then
      begin
        PostFixTreeWalk(p^.down, proc);
        PostFixTreeWalk(p^.right, proc);
        proc(p);
      end;
  end; { PostFixTreeWalk }

{ Find the named point rec.  Return nil if not found. }
  function fFindTreeName; { (trp : TreeRecPtr; n : nameStr) : PRecPtr; }
    var
      p: PRecPtr;
    procedure ThisName (p1: PRecPtr);
      var
        p1name: string;
    begin     { See if the name of this point rec is equal to n. }
      if p = nil then
        begin
          p1name := PRecName(p1);
          if EqualString(p1name, n, false, true) then
            p := p1;
        end;
    end;

  begin
    p := nil;
    PreFixTreeWalk(trp^.TreeRoot, ThisName);
    fFindTreeName := p;
  end;   { fFindTreeName }

  function InsertPt;
{• function InsertPt (trp : TreeRecPtr;•}
{•     glob : boolean;•}
{•      parent : PRecPtr;•}
{•      x, y, z : Integer;•}
{•      r, p, yw : integer;•}
{•     rbool, dbool : boolean;•}
{•      newName : string) : PRecPtr;•}
{   InsertPt inserts a 3d point into the world tree structure being}
{   created.  glob is true if x,y,z are given in global coordinates, false}
{   if they are local to the given parent.  "parent" is the point that will}
```

-000388

```
{   be the new points parent, x,y,z are cartisian coordinates, r,p,yw are}
{   the roll, pitch and yaw for any subpoints of the new point.  "rbool"}
{   is true if a connecting line should be drawn to the right from this}
{   point and "dbool" is true if a connecting line should be drawn down to}
{   this points children.  The point is inserted into the tree as the}
{   furthest right child of the given parent.}
{ }

   var
     p1, tp: PRecPtr;
  begin
   NewIt(trp, tp);
   if tp <> nil then
     begin
       if glob then
         begin  { convert x,y,z from glob to local coordinates. }
           x := x - 65;
           y := y - 132;
           p1 := parent;
           repeat          { Traverse the tree, converting each step of the way. }
             x := x - p1^.lSix.pt.x;
             y := y - p1^.lSix.pt.y;
             z := z - p1^.lSix.pt.z;
             p1 := p1^.up;
           until p1 = nil;
         end;
       if parent^.down = nil then
         parent^.down := tp
       else
         begin                      { find rightmost child of the parent. }
           p1 := parent^.down;
           while p1^.right <> nil do
             p1 := p1^.right;
           p1^.right := tp;       { insert to right of all existing children }
         end;
       with tp^ do
         begin
           up := parent;
           down := nil;
           right := nil;
           lSix.pt.x := x;
           lSix.pt.y := y;
           lSix.pt.z := z;
           lSix.tt.roll := degRange(r);
           lSix.tt.yaw := degRange(yw);
           lSix.tt.pitch := degRange(p);
           Lright := rbool;
           Ldown := dbool;
           name := newName;
           dirty := true;
           rBandPtr := nil;
           flags := [];
           ShowName := false;
```

```
      end;
    end;
   InsertPt := tp;
  end;{ InsertPt }

  function InsertCopyofPt; { (trp : TreeRecPtr; parent ,origPt: PRecPtr): PRecPtr; }
   { Insert a point into the given tree under the given parent and copy all of the position, name etc }
   { of the origPt to the new point. }
   var
    tp, p1: PRecPtr;
  begin
   NewIt(trp, tp);
   if tp <> nil then
    begin
     tp^ := origPt^;
     if parent^.down = nil then
      parent^.down := tp
     else
      begin                     { find rightmost child of the parent. }
       p1 := parent^.down;
       while p1^.right <> nil do
        p1 := p1^.right;
       p1^.right := tp;         { insert to right of all existing children }
      end;
     with tp^ do
      begin
       up := parent;
       down := nil;
       right := nil;
       rBandPtr := nil;
       dirty := true;
      end;
    end;
   CheckTree(trp, false);
   InsertCopyofPt := tp;
  end;

  procedure MakeGarbageList; { (trp : TreeRecPtr) }
 { Make a linked list of all the unused PointRec 's for this tree. garbagePtr will point }
 { to the first one in the list. }
 { With the new tree (Storage an array of pointers) this routine just disposes of all nodes not used. }
   var
    i: integer;
    used: array[1..maxStorage] of boolean;
    p: PRecPtr;
   procedure markUsed (p: PRecPtr);
    var         { mark this PointRec as being used in the used array. }
     l: longInt;
   begin
    l := longInt(PtrtoIdx(trp, p));     { turn ptr into index }
    used[l] := true;
   end;
  begin
```

```
    for i := 1 to maxStorage do        { clear the used array }
      used[i] := false;
    p := trp^.storage[1];              { storage[1] is always the metaWorld Point }
    PrefixTreeWalk(p, markUsed);
    for i := maxStorage downto 1 do
      if not used[i] then
        DisposeIt(trp, IdxtoPtr(trp, PRecPtr(i)));
  end;

  procedure CheckTree (trp: TreeRecPtr; CleanOut: Boolean);
{ Check the integrity of the pointers in this tree. }
    type
      usedType = (tree, garbage, unUsed);
    var
      used: array[1..maxStorage] of usedType;
      CheckErr: boolean;
      i: integer;
      p1: PRecPtr;
    procedure PrintNode (p: PRecPtr);
      const
        sp = ' ';
      var
        str1, str2: string;
    begin
      write('[', PtrtoL(trp, p) : 2, ',', PtrtoL(trp, p^.up) : 2, ',');
      write(PtrtoL(trp, p^.down) : 2, ',', PtrtoL(trp, p^.right) : 2, ']');
      if p^.Lright then
        write('R')
      else
        write('r');
      if p^.Ldown then
        write('D')
      else
        write('d');
      with p^.ISix.pt do
        write(', Loc: ', x : 3, ',', y : 3, ',', z : 3, ',');
      with p^.ISix.tt do
        writeln(' Deg: ', roll : 3, ',', pitch : 3, ',', yaw : 3);
      with p^.gPt do
        write('  Glob: ', x : 3, ',', y : 3, ',', z : 3);
      writeln(', "', p^.name, '"');
    end;

    procedure CheckError (p: PRecPtr; errstr: string);
      var
        ch: char;
    begin
      showtext;
      writeln;
{•    if trp = maintreeptr then•}
{•      write('mainTree ')•}
{•    else•}
{•      write('clipTree ');•}
```

```
    printnode(p);
    writeln(errstr);
    writeln;
    read(ch);
    CheckErr := true;
  end;

  procedure CheckSubTree (parent, p: PRecPtr);
        { Check this sub tree. }
  begin
    while (p <> nil) and not CheckErr do
      begin
        if (used[PtrtoL(trp, p)] <> unUsed) then
          CheckError(p, stringof('This index is already ', used[PtrtoL(trp, p)]))
        else if (p^.up <> parent) then
          begin
            write('Parent:  ');
            printnode(parent);
            write('p^.up:  ');
            printnode(p^.up);
            CheckError(p, 'Parent not parent.');
          end
        else if p^.down <> nil then
          begin
            used[PtrtoL(trp, p)] := tree;
            CheckSubTree(p, p^.down);
          end;
        used[PtrtoL(trp, p)] := tree;
        p := p^.right;
      end;
  end;
begin
  if doCheck then
    begin
      CheckErr := false;
      for i := 1 to maxStorage do
        if trp^.Storage[i] = nil then
          used[i] := garbage
        else
          used[i] := unUsed;
      with trp^.Storage[1]^ do
        begin
          if (up <> nil) or (right <> nil) or (PtrtoL(trp, down) = -1) then
            CheckError(trp^.Storage[1], 'Error with the metaWorld.')
          else
            begin
              used[1] := tree;
              CheckSubTree(trp^.Storage[1], down);
            end;
        end;
      for i := 1 to maxStorage do
        if (used[i] = unUsed) then
          if CleanOut then
```

```
          begin
            printnode(trp^.Storage[i]);
            writeln(' Cleaning out unused storage.');
            DisposeIt(trp, trp^.Storage[i]);
          end
        else
          CheckError(trp^.Storage[i], ' This storage not used.');
    end;
  end;

  procedure fNewTree; { (trp : TreeRecPtr) }
{ This is called by InitTree or if you choose new from the file menu. Start out }
{ with a brand new tree with the world pointer in the center of the window. }
    const
      t = true;
      f = false;
    var
      i: integer;
      p: PRecPtr;
      hv, hh: integer;

  begin
    for i := 1 to MaxStorage do
      if trp^.Storage[i] <> nil then
        DisposeIt(trp, trp^.Storage[i]);
    NewIt(trp, p);
    if (PtrtoL(trp, p) <> 1) then
      Announce('fNewTree: first NewIt <> 1');
    with trp^.storage[1]^ do
      begin
        name := 'metaWorld';
        up := nil;
        down := nil;
        right := nil;
        lSix.pt.x := 0;
        lSix.pt.y := 0;
        lSix.pt.z := 0;
        gPt := lSix.pt;
        lSix.tt.yaw := degRange(0);
        lSix.tt.pitch := degRange(0);
        lSix.tt.roll := degRange(0);
        Lright := false;
        Ldown := false;
        sines.yaw := 0;
        sines.pitch := 0;
        sines.roll := 0;
        cosines.yaw := 1;
        cosines.pitch := 1;
        cosines.roll := 1;
        SetDefaultMinMax(trp^.Storage[1]);
      end;
    MakeGarbageList(trp);
    trp^.NxtStor := 2;
```

```
  trp^.treeRoot := InsertPt(trp, f, trp^.storage[1], 0, 0, 0, 0, 0, 0, f, f, 'World');
  trp^.dirty := true;
  trp^.EdPtr := trp^.TreeRoot;
  CheckTree(trp, false);
end;

procedure TreeClear; { (trp : TreeRecPtr) }
{ Clear the edit point for this tree and everything under it. }
  var
    i: integer;
    p, parent: PRecPtr;
    deleted: array[1..maxStorage] of boolean;{ true if this record is cut. }

  procedure cutPt (p: PRecPtr); { Cut, dispose and mark this point. }
  begin
    deleted[PtrtoL(trp, p)] := true;
    DisposeIt(trp, p);
  end;

  procedure unHookBand (p: PRecPtr);
  begin { unhook all rubberbands from the tree to points that were deleted. }
    with p^ do
      if rBandPtr <> nil then
        if deleted[PtrtoL(trp, rBandPtr)] then
          rBandptr := nil;
  end;

begin
  for i := 1 to maxStorage do
    deleted[i] := false;
  with trp^ do
    if (edPtr <> nil) then
      if (edPtr <> TreeRoot) then
        begin
          parent := edPtr^.up;
          p := edPtr^.up;
          if p^.down = edPtr then { edPtr is the first child of the parent }
            p^.down := edPtr^.right { so make the next child the first child. }
          else
            begin
              p := p^.down;
              while p^.right <> edPtr do { find the child before edptr }
                p := p^.right;
              p^.right := p^.right^.right; { and make it point to the child past edptr. }
            end;
          PostFixTreeWalk(edPtr^.down, cutPt);
          cutPt(edPtr);
          edPtr := parent; { Make the edit pointer the old points parent. }
          PostFixTreeWalk(TreeRoot, unHookBand);
        end;
end;

procedure CopySubTree; { (source, dest : TreeRecPtr) }
```

```
{ Copy the source.edPtr and everything under it to right below destTrp.edptr }
{ If the source edptr is nil then don't do anything.  If the dest edptr is nil then }
{ copy the source to right below the dest worldptr. }
  var
    info: array[1..maxStorage]  of record
        marked: boolean;       { true if this record in source^.Storage is used. }
        newIdx: integer;       { index of the corresponding record in dest^.Storage }
        suf: SuffixType;       { unique name for dest^.storage[newIdx] }
      end;
    i, j, sourceCount: integer;
    p1, p2, pu, pr: PRecPtr;
    name: string;

  function fixUpPtr (p: PRecPtr): PRecPtr;
  begin
    if p = nil then
      fixUpPtr := nil
    else
      fixUpPtr := IdxtoPtr(dest, PRecPtr(info[PtrtoL(source, p)].newidx));
  end;

  function NameInUse (idx: integer): boolean;
    { Return true if this name is in use in either the DM list or the DM clipboard. }
    var
      j: integer;
      n: NameStr;
  begin
    NameInUse := false;
    n := AddSuffix(info[idx].suf);
    if fFindTreeName(dest, n) <> nil then
      NameInUse := true              { Yes, return true. }
    else
      begin                         { No, check in the clipboard up to this name. }
        for j := 0 to idx - 1 do
          if info[j].marked then
            if n = AddSuffix(info[j].suf) then
              begin
                NameInUse := true;
                leave;
              end;
      end;
  end;


  procedure MarkandUniqueName (p: PRecPtr);
  { Mark this index as being used and make a unique name for it. }
    var { If the name of this node already exists in the dest tree change it. }
      nameNum: string;
      i, sidx: integer;
  begin
    sourceCount := sourceCount + 1;
    sidx := PtrtoL(source, p);
    info[sidx].marked := true;
```

```
    ExtractSuffix(p^.name,  info[sidx].suf);
    if p^.name <> '' then       { Name is not nul. }
      if NameInUse(sidx) then
        with info[sidx] do
          begin
            suf.n := 1;
            while NameInUse(sidx) do
              begin
                suf.n := suf.n + 1;
              end;
          end;
  end;

begin
  if source^.edPtr <> nil then
    begin
      for i := 1 to maxStorage do       { initialize the info array. }
        with info[i] do
          begin
            marked := false;
            newIdx := -1;
          end;
      { First, for every node in the sub-tree to copy, if there is already a node }
      { with this name then put a number on the end of the name.  Inc the number }
      { until the name is unique.  Also mark the node index as being in the sub-tree. }
      sourceCount := 0;    { set count of how many nodes to add to zero. }
      MarkandUniqueName(source^.edPtr);
      PreFixTreeWalk(source^.edPtr^.down,  MarkandUniqueName);
      i := 0;
      for j := 1 to MaxStorage do
        if dest^.Storage[j] = nil then
          i := i + 1;
      if i <= sourceCount then
        begin   { Ack!  The dest tree doesn't have enough room }
          sysbeep(3);
          Announce('Not enough room in the destination tree to paste.');
        end
      else
        begin
          for i := 1 to maxStorage do         { Move all the PointRec's into the dest }
            if info[i].marked then            { Storage array with new names. }
              begin
                NewIt(dest,  p1);
                info[i].newIdx := PtrtoL(dest,  p1);
                p1^ := source^.Storage[i]^;
                p1^.name := AddSuffix(info[i].suf);
              end;
          for i := 1 to maxStorage do         { Fixup all the up,down & right pointers }
            if info[i].marked then            { in the dest }
              with source^.Storage[i]^ do
                begin
                  p1 := source^.Storage[i];
                  p2 := dest^.Storage[info[i].newidx];
```

```
              p2^.up := fixUpPtr(p1^.up);
              p2^.down := fixUpPtr(p1^.down);
              p2^.right := fixUpPtr(p1^.right);
              if p1^.rBandPtr = nil then
                p2^.rBandPtr := nil
              else if info[PtrtoL(source, p1)].marked then
                p2^.rBandPtr := fixUpPtr(p1^.rBandPtr)
              else
                p2^.rBandPtr := nil;
            end;
      { Connect the edit point or TreeRoot in the destination to the top }
      { point of what is being moved.  Make p1 = dest version of source^.edPtr. }
          i := info[PtrtoL(source, source^.edPtr)].newIdx;
          p1 := IdxtoPtr(dest, PRecPtr(i));
          with dest^ do
            begin
              if edPtr = nil then
                edPtr := TreeRoot;
              if edPtr^.down = nil then        { new subtree is the only thing under }
                edPtr^.down := p1              { the edPtr. }
              else
                begin                          { There is other stuff under the }
                  p2 := edPtr^.down;           { edptr, so make this the last thing }
                  while p2^.right <> nil do    { to the right. }
                    p2 := p2^.right;
                  p2^.right := p1;
                end;
              p1^.up := edPtr;                 { subtree always under the edptr, }
              p1^.right := nil;                { and nothing to the right of subtree. }
            end;
        end;    { if the dest tree has enough empty nodes. }
      CheckTree(source, false);
      CheckTree(dest, false);
    end;            { If source edptr <> nil. }
  end;    { CopySubTree }

{ Add a new point off of the current edit point and make it the new edit point. }
  procedure TreeAddPoint; { • (trp : TreeRecPtr;•}
{•    down, doline : boolean);•}
    const
      f = false;
    var
      p, p1: PRecPtr;
      pt: point;
  begin
    if trp^.edPtr = trp^.TreeRoot then
      down := true;
    if trp^.edPtr <> nil then
      begin
        if down then
          begin
            p := trp^.edPtr;
            pt.h := 8;
```

```
          pt.v := 8;
          trp^.edPtr^.LDown := doline;
        end
      else
        begin
          p := trp^.edPtr^.up;
          pt.h := trp^.edPtr^.ISix.pt.x + 8;
          pt.v := trp^.edPtr^.ISix.pt.x + 8;
          trp^.edPtr^.LRight := doline;
        end;
      trp^.edPtr := InsertPt(trp, f, p, pt.h, pt.v, 0, 0, 0, 0, f, f, '');
      trp^.dirty := true;
      FileDirty[treeFile] := true;
    end;
end;

procedure Circleize; {•(parPtr: PRecPtr;•}
                     {•    radius : integer);•}
{ Form all the points down from the edit point into a circle around x and y. }
  var
    p: PRecPtr;
    i, points: integer;
    roll: real;
    str, str2: Str255;
    l: LongInt;
begin
  if parPtr = nil then
    AnnounceB('No edit point specified. ')
  else if parPtr^.down = nil then
    AnnounceB('Edit point down is NIL.')
  else
    begin
      if radius = 0 then
        begin
          str := '10';
          if GetStrings('Radius to circle around?', '', str, str2) then
            begin
              StringtoNum(str, l);
              radius := l;
            end;
        end;
      p := parPtr^.down;
      points := 1;
      while p^.right <> nil do
        begin
          points := points + 1;
          p := p^.right;
        end;
      roll := 0;
      if not odd(points) then
        roll := (3600 / points) / 2;
      p := parPtr^.down;
      for i := 0 to points - 1 do
```

```
        begin
          p^.Lright := true;
          p^.lSix.pt.y := -radius;
          p^.lSix.pt.x := 0;
          Rot(p^.lSix.pt.x, p^.lSix.pt.y, degRange(round(roll)));
          p := p^.right;
          roll := roll + 3600 / points;
        end;
    end;
end;        { Circleize }

procedure TreeAddObj; { (trp : TreeRecPtr) }
  var
    p, p1: PRecPtr;
    i: integer;
    str, str2: Str255;
    l: LongInt;
begin
  if trp^.edPtr = nil then
    sysbeep(3)
  else
    begin
      if OptionIsDown then
        begin
          str := ntos(TreeConfig.PolygonSize);
          if GetStrings('Number of points for the polygon', '', str, str2) then
            begin
              StringtoNum(str, l);
              TreeConfig.PolygonSize := l;
            end;
        end;
      p := trp^.edPtr;
      TreeAddPoint(trp, true, false);     { down point }
      p1 := trp^.edPtr;
      trp^.edPtr^.lSix.pt.x := 30;
      trp^.edPtr^.lSix.pt.y := 0;
      TreeAddPoint(trp, true, false);     { first child }
      for i := 1 to TreeConfig.PolygonSize - 1 do
        TreeAddPoint(trp, false, true);  { and the rest of the kids. }
      trp^.edPtr := p;
      Circleize(p1, 20);
      FileDirty[treeFile] := true;
      if false then
        CheckTree(trp, false);
    end;
end;

procedure SetSixth (p: PRecPtr; sixIdx, newvalue: integer);
{ put the newValue into one of the six local values for this PointRec.  sixIdx says }
{ which one it should be (x,y,z,yaw,pitch,roll).  Clip to whatever min/max is. }
  var
    vip, minPtr, maxPtr: IntPtr;
    i: integer;
```

```
   function DegClip (newValue, min, max: integer): integer;
{ return newValue clipped to be in the range min..max.  min and max are in the }
{ range 0..359 and newValue is forced into 0..359.  }
    var
      mid: integer;
   begin
     newvalue := degRange(newvalue);        { put newValue into 0..3599 }
     if min > max then
       begin              { force min to be less than max. }
         if newValue >= min then              { so we can do > < compares. }
           newValue := newValue - 3600;
         min := min - 3600;
       end;
     if (newValue >= min) and (newValue <= max) then
       DegClip := degRange(newValue)
     else
       begin
         mid := degRange((max - min) div 2 + min + 1800);    { mid angle of invalid arc }
         if degRange(mid - newValue) < 1800 then
           i := max
         else
           i := min;
         DegClip := degRange(i);
       end;
   end;

  begin
   if p <> nil then
     with p^ do
       begin
         vip := @lSix.s[sixIdx];
         minPtr := @mins.s[sixIdx];        { smallest }
         maxPtr := @maxs.s[sixIdx];        { largest }
         if (sixIdx < 3) then   { translation is just linear clipping. }
           newvalue := MinMaxOf(minPtr^, newvalue, maxPtr^)
         else
           newvalue := DegClip(newvalue, minPtr^, maxPtr^);
         SGIdirty := true;
         vip^ := newvalue;
         dirty := true;
       end;
  end;
  function GetSixth (p: PRecPtr; sixIdx: integer): integer;
  begin
   GetSixth := p^.lSix.s[sixIdx];
  end;

  procedure ConstrainPt (p: PRecPtr);
{ Apply whatever constraints are on this point to it's x,y,z,roll,pitch,yaw. }
   var
     i, v: integer;
  begin
   for i := 0 to 5 do
```

```
      begin
        v := p^.lSix.s[i];
        p^.lSix.s[i] := -3333;
        SetSixth(p, i, v);
      end;
    with p^ do
      begin
        SGldirty := true;
        dirty := true;
      end;
  end;


end.
```

```
unit GestDM;

interface
  uses
    ChuckStuff, AutoLib, FastStuff, Globals, Tree3DGlob, {}
    MiscRoutines, Tree3D, formTree3D, DMTypes, DMGlobals;

  procedure doNonZero (var dm: DMRec);
  procedure doGest (var dm: DMRec);
  procedure HandleGest (v: DMVerb; var dm: DMRec);
  procedure doLookup (var dm: DMRec);
  procedure HandleLookup (v: DMVerb; var dm: DMRec);

  procedure doLatch (var dm: DMRec);
  procedure doFire (var dm: DMRec);

implementation

  const
    GestID = 2130;
    LookupID = 2131;
    maxGestIn = 6;

  type    { Private storage for a Gest DM. }
    GestPvtType = record
        mins: array[0..maxGestIn] of integer;
        maxs: array[0..maxGestIn] of integer;
        GestValue: integer;
      end;
    GestPvtPtr = ^GestPvtType;

{------------------------------------------------------}
{ FirstNonZero DM returns the first one of it's inputs that isn't zero. }
  procedure doNonZero; { (var dm : DMRec) }
    var
      i, nonzer: integer;
  begin
    nonzer := 0;
    for i := 0 to dm.inputs - 1 do
      with dm.SlotsIn[i] do
        if ptrfrm^.i <> 0 then
          begin
            nonzer := ptrfrm^.i;
            leave;
          end;
    with dm.PointsOut[0] do
      begin
        LastValue.i := nonzer;
        if ptrto <> nil then
          SetSixth(ptrto, ord(SixAxis), LastValue.i);
      end;
  end;
```

```
{------------------------------------------}
 procedure doGest; { (var dm : DMRec) }
   var
     passed: boolean;
     i: integer;
     sptr: GestPvtPtr;
 begin
   sptr := GestPvtPtr(dm.private);
   passed := true;
   for i := 0 to dm.inputs - 1 do
     with dm.SlotsIn[i] do
       begin
         if MinMaxOf(sptr^.mins[i], ptrfrm^.i, sptr^.maxs[i]) <> ptrfrm^.i then
           begin
             passed := false;
             leave;
           end;
       end;
   with dm.PointsOut[0] do
     begin
       if passed then
         LastValue.i := sptr^.GestValue
       else
         LastValue.i := 0;
       if ptrto <> nil then
         SetSixth(ptrto, ord(SixAxis), LastValue.i);
     end;
 end;

{ HandleGest has all the routines nessessary to interpret one gesture based on 6 inputs. }
 procedure HandleGest; {•(v : DMVerb;•}
                       {•    var dm : DMRec);•}

   var
     i: integer;
     h: handle;
     sptr: GestPvtPtr;

   procedure Calibrate (var dm: DMRec);
     var { calibrate this Gest dm. }
       sptr: GestPvtPtr;
       text: str255;
       l: LongInt;
       i, itemHit: integer;
       dPtr: DialogPtr;
   begin
     sptr := GestPvtPtr(dm.private);
     if sptr = nil then
       Announce('Error, private pointer is nil.')
     else
       begin
         ParamText(dm.name, '', '', '');
```

```
      dPtr := GetNewDialog(GestID, nil, pointer(-1));
      for i := 0 to maxGestIn - 1 do
        begin
          SetEdText(dPtr, i + 1, StringOf(sptr^.mins[i] : 1));
          SetEdText(dPtr, i + maxGestIn + 1, StringOf(sptr^.maxs[i] : 1));
          if dm.SlotsIn[i].ptrfrm <> nil then
            text := SlotName(dm.SlotsIn[i])
          else
            text := concat('Input #', ntos(i));
          SetDlgText(dPtr, statText, i + 2, text);
        end;
      SetEdText(dPtr, maxGestIn * 2 + 1, StringOf(sptr^.GestValue : 1));
      repeat
        ModalDialog(nil, itemHit);
      until ItemHit < 3;
      if ItemHit = 1 then
        begin     { OK }
          for i := 0 to maxGestIn - 1 do
            begin
              GetEdText(dPtr, i + 1, text);
              StringtoNum(text, l);
              sptr^.mins[i] := l;
              GetEdText(dPtr, i + maxGestIn + 1, text);
              StringtoNum(text, l);
              sptr^.maxs[i] := l;
            end;
          GetEdText(dPtr, maxGestIn * 2 + 1, text);
          StringtoNum(text, l);
          sptr^.GestValue := l;
        end;
      DisposDialog(dPtr);
    end;
  end;

begin
  case v of
    initDM:              { Called once the first time this DM is started. }
      begin
        if dm.private <> nil then
          doClose(dm);
        h := NewHandle(sizeof(GestPvtType));
        if h <> nil then
          begin
            MoveHHi(h);
            HLock(h);
            dm.private := h^;
            sptr := GestPvtPtr(dm.private);
            for i := 0 to maxGestIn - 1 do
              begin
                sptr^.mins[i] := 0;
                sptr^.maxs[i] := 1800;
              end;
            sptr^.GestValue := 0;
```

```
        Calibrate(dm);
       end
      else
       begin
        Announce('Not enough memory to open this Gest DM');
        dm.state := usrOff;
       end;
    end;
   massageDM:         { Called once through the main loop. do a massage }
    doGest(dm);
   closeDM:           { Called when this module is deleted. Do whatever... }
    doClose(dm);
   reHookedDM:
    ;                 { DM has been re-hooked up. who cares? }
   fopenDM:           { This DM has just been read from a file. If it's state is }
                      { on it was hooked up properly. private points to the }
    begin             { private memory it had when saved. }
    end;
   fsaveDM:           { This DM is about to be saved to a file. Do any changes }
    begin             { nessessary to private memory so it can be restored later. }
    end;
   calibDM:           { Calibrate the DM module. }
    begin
     Calibrate(dm);
    end;
   describeDM:        { put a description into describeStr }
    begin
     sptr := GestPvtPtr(dm.private);
     describeStr := StringOf('Gesture # = ', sptr^.GestValue : 1, '.');
    end;
   writeCodeDM:
    ;
   otherwise          { Should be no other. }
    sysbeep(3);
  end;      { case }
 end;       { HandleGest }

{-----------------------------------------}
 procedure doLookup; { (var dm : DMRec) }
  var
   i, input: integer;
   sptr: GestPvtPtr;
 begin
  sptr := GestPvtPtr(dm.private);
  input := dm.SlotsIn[0].ptrfrm^.i;
  with dm.PointsOut[0] do
   begin
    LastValue.i := sptr^.GestValue;
    for i := 0 to 5 do
     if input = sptr^.mins[i] then
      begin
       LastValue.i := sptr^.maxs[i];
       leave;
```

-000405

```
        end;
      if ptrto <> nil then
        SetSixth(ptrto, ord(SixAxis), LastValue.i);
    end;
  end;

{ HandleLookup has all the routines nessessary to interpret one Lookup based on 6 inputs. }
  procedure HandleLookup;   {•(v : DMVerb;•}
                            {•     var dm : DMRec);•}

    var
      i: integer;
      h: handle;
      sptr: GestPvtPtr;

    procedure Calibrate (var dm: DMRec);
      var { calibrate this Lookup dm. }
        sptr: GestPvtPtr;
        text: str255;
        l: LongInt;
        i, itemHit: integer;
        dPtr: DialogPtr;
    begin
      sptr := GestPvtPtr(dm.private);
      if sptr = nil then
        Announce('Error, private pointer is nil.')
      else
        begin
          ParamText(dm.name, '', '', '');
          dPtr := GetNewDialog(LookupID, nil, pointer(-1));
          for i := 0 to 5 do
            begin
              SetEdText(dPtr, i + 1, StringOf(sptr^.mins[i] : 1));
              SetEdText(dPtr, i + maxGestIn + 1, StringOf(sptr^.maxs[i] : 1));
            end;
          SetEdText(dPtr, maxGestIn * 2 + 1, StringOf(sptr^.GestValue : 1));
          repeat
            ModalDialog(nil, itemHit);
          until ItemHit < 3;
          if ItemHit = 1 then
            begin     { OK }
              for i := 0 to 5 do
                begin
                  GetEdText(dPtr, i + 1, text);
                  StringtoNum(text, l);
                  sptr^.mins[i] := l;
                  GetEdText(dPtr, i + maxGestIn + 1, text);
                  StringtoNum(text, l);
                  sptr^.maxs[i] := l;
                end;
              GetEdText(dPtr, maxGestIn * 2 + 1, text);
              StringtoNum(text, l);
              sptr^.GestValue := l;
```

-000406

```
        end;
      DisposDialog(dPtr);
    end;
  end;

begin
  case v of
    initDM:              { Called once the first time this DM is started. }
      begin
        if dm.private <> nil then
          doClose(dm);
        h := NewHandle(sizeof(GestPvtType));
        if h <> nil then
          begin
            MoveHHi(h);
            HLock(h);
            dm.private := h^;
            sptr := GestPvtPtr(dm.private);
            for i := 0 to maxGestIn - 1 do
              begin
                sptr^.mins[i] := 0;
                sptr^.maxs[i] := 0;
              end;
            sptr^.GestValue := 0;
            Calibrate(dm);
          end
        else
          begin
            Announce('Not enough memory to open this Lookup DM');
            dm.state := usrOff;
          end;
      end;
    massageDM:           { Called once through the main loop. do a massage }
      doLookup(dm);
    closeDM:             { Called when this module is deleted. Do whatever... }
      doClose(dm);
    reHookedDM:
      ;                  { DM has been re-hooked up. who cares? }
    fopenDM:             { This DM has just been read from a file. If it's state is }
                         { on it was hooked up properly. private points to the }
      begin              { private memory it had when saved. }
      end;
    fsaveDM:             { This DM is about to be saved to a file. Do any changes }
      begin              { nessessary to private memory so it can be restored later. }
      end;
    calibDM:             { Calibrate the DM module. }
      begin
        Calibrate(dm);
      end;
    describeDM:          { put a description into describeStr }
      begin
        sptr := GestPvtPtr(dm.private);
        describeStr := StringOf('Lookup Table ');
```

```
        for i := 0 to 5 do
          describeStr := StringOf(describeStr, ', ', sptr^.mins[i] : 1, ': ', sptr^.maxs[i]);
        describeStr := StringOf(describeStr, ' else ', sptr^.GestValue : 1, '.');
      end;
    writeCodeDM:
      ;
    otherwise          { Should be no other. }
      sysbeep(3);
  end;       { case }
 end;        { HandleLookup }

{ Latch the output to Input #1 until Input #2 is non-zero (true). }
 procedure doLatch;
 begin
   with dm.PointsOut[0] do
     if dm.SlotsIn[1].ptrfrm^.i <> 0 then
       begin
         LastValue.i := dm.SlotsIn[0].ptrfrm^.i;
         if ptrto <> nil then
           SetSixth(ptrto, ord(SixAxis), LastValue.i);
       end;
 end;

{ Out1 = In1 but tree point is only changed when In1 changes. }
 procedure doFire;
 begin
   with dm.PointsOut[0] do
     if dm.PrivateWords[0] <> dm.SlotsIn[0].ptrfrm^.i then
       begin
         LastValue.i := dm.SlotsIn[0].ptrfrm^.i;
         if ptrto <> nil then
           SetSixth(ptrto, ord(SixAxis), LastValue.i);
         dm.PrivateWords[0] := LastValue.i;
       end;
 end;

end.
```

```
{ DataSuit Global variables, constants and type definitions. }
{ This unit doesn't have any code }

{  By Chuck Blanchard,  7/24/87}
{  Copyright 1985 VPL Research, Inc.  All rights reserved}


unit Globals;

interface

  const  {menu stuff}
    AppleMenu = 100;
{ File Menu definiton. }
    FileMenu = 101;

{-- File2 is used if this is a turnkey system. }
    File2Menu = 110;
    HReset2Item = 1;                     {   Hardware Reset  }
    Config2Item = 2;                     {   Configure Tree   }
    SaveAsT2Item = 3;                    {   Save Tree As }
    Quit2Item = 4;                       {   Quit            }

    EditMenu = 102;

    DAMenu = 106;
    OpenRItem = 1;                       { Open Raw }
    SaveRItem = 2;                       { Save Raw }
    RecRItem = 3;                        { Record Raw }
    PlayRItem = 4;                       { Play Raw }
                                         {   ------- }
    ResetDAItem = 6;                     { Reset All }
    TogDecItem = 7;                      { Display Decimal }

    DMMenu = 107;
    OpenMItem = 1;                       { Open Massaged }
    SaveMItem = 2;                       { Save Massaged }
    RecMItem = 3;                        { Record Massaged }
    PlayMItem = 4;                       { Play Massaged }
                                         {   ------- }
    AddDMItem = 6;                       { Add Massage module }
    DelDMItem = 7;                       { Edit Massage List }
                                         {   ------- }
    TurnOffDMItem = 9;                 { Turn Off all DM's }

      { The Tree menu Item constants are defined in Tree3d.pas }
    TreeMenu = 108;
      { So are any Render menu Items there are.  (render menu used for turnkey) }
    RenderMenu = 111;

    ScriptMenu = 109;
      { The Script menu item constants are defined in scripts.pas }
```

```
   WindowMenu = 105;
   TreeWItem = 1;
   RawWItem = 2;

   IsaacMenu = 112;

   popUpMenuID = 125;         { Menu ID for the DMtypes popup menu. }
   tempPopMenuID = 126;       { Menu ID for a temporary popup menu. }
   sixAxisPopMenuID = 127;

   AppType = 'DSUT';          { The applications Finder creator type }

   { Dialog box resource numbers. }
   AboutID = 1533;          { About dialog box resource number. }
   HelpID = 1537;           { Help dialog resource number. }
   OKCancelID = 1553;       { Generic OK,Cancel dialog box. }
   JustTextID = 1555;       { A dialog box with just static text '^0'. }

   { Alert box resource numbers. }
   HostErrID = 1538;        { Host error alert box. }
   YesNoID = 1539;          { Generic Yes, No, Cancel box }
   BadNewsID = 1560;        { Put up message and say sorry. }

   { Cursor resource numbers }
   handCursID = 256;

{$ifc Profile_On }
   maxRawData = 80;
{$elsec }
   maxRawData = 150;          { the rawData array is 0..maxRawData }
{$endc }

   nameSize = 21;             { number of chars in a nameStr }

{ Definitions for event messages that are passed around within the application. }
{ Message with event1 have a case selector in the lower 8 bits. }
   RawPlayOffMsg = 1;       { message posted when raw play gets turned off. }
   ExStartupMsg = 3;        { execute startup scripts.  The msg is modified with }
   ApplStartBit = $100;     { the following bits to specify which types of files }
   TreeStartBit = $200;     { should have their .Startup scripts executed. }
   DMStartBit = $400;

 type
   CharSet = set of Char;
   ByteSet = set of Byte;
   IntPtr = ^Integer;

   nameStr = string[nameSize];

   { DAmodState has the current state for a Data Massage module. }
   DAmodState = (DAon, DAoff, DAerrored);

   { DAVerb are the commands to send to a DataAcquisition routine. }
```

-000410

```
DAVerb = (initDA, openDA, closeDA, readDA, resetDA);

{ DARec has all the information needed to describ a DataAcquisition interface }
DARec = record
    Private: Ptr;              { pointer to a private record. }
    ptrto: IntPtr;           { pointer to the first slot in the RawData array. }
    state: DAmodState;         { current state of the data aq module. }
    FirstSlot: integer;        { Index to the first slot. }
    Size: integer;           { Number of slots in RawData. }
    name: nameStr;             { Name of this interface. }
  end;

{ myWindowTypes describes all the different windows I have.  myWindowRec }
{ has the window pointer and some characteristics of each window. }
                  { Must be first...                          ...Must be last. }
myWindowTypes = (DataW, FastD, ScatW, HostW, CntrlD, GestW, LiveW);

myWindowRec = record
    wptr: WindowPtr;
    useEdit: boolean; { True if this window uses the edit menu. }
  end;

{ Definitions for the Data Aq configuration record. }
DABitType = (GBIIBit, polhmBit, flashBit, clockBit, adiosBit, midiBit, hostBit, turnKeyBit, {}
  rdPolhm, rdGest, DF_MultiBit, DF_EandFBit, rdGlove, un13Bit, un14Bit, un15Bit);
DABitTypeSet = set of DABitType;

DAserialType = (modemP, printerP, superMacC, creativeSC, wantsModem, wantsPrinter);
DAserialTypeSet = set of DAserialType;

baudRateType = (b192, b96, b48, s1, s15, s2);
baudTypeSet = set of baudRateType;

HostConfigType = record                    { Configuration for the host communications. }
    BaudRate, Parity,                      { These are actually the button number the user has }
    Stops, Change: Byte;                 { selected.  HostCom converts them into the proper values. }
  end;

DAconfigRec = record
    Bits: DABitTypeSet;
    adiosSlot, adiosUse: integer;
    maxGBoxes, maxPolhms: integer;
    serialConfig: DAserialTypeSet;
    gloveBaud, polhmBaud: baudTypeSet;
    HostConfig: HostConfigType;
  end;

{ inFileType describes which file owns a script or alias.  Either the application, treeFile, }
{ DMfile or nobody.  If nobody, when the application quits the script is thrown }
{ away without any notification. }
inFileType = (applRad, TreeRad, DMRad, NoneRad);
```

```
   { types of files that can be opened/saved. }
   fileType = (treeFile, dmFile);

{ The following are type definitions for SlotDescs.  A SlotDesc is an array of integers }
{ each of which is a dataSlot.  Each Slot has a name and possibly other attributes. }
{ This is used for both the Raw window and the DM's window.  Each one has an array }
{ of values with associated names.  The SlotDesc for each of these has pointers }
{ to the data, names and windows.  With This the SlotUnit can manage displaying }
{ the window for this slot. }
   rawDataIndex = 0..maxRawData;
   SlotDefType = record
      name: nameStr;
      flags: integer;
    end;
   SlotDefArType = array[rawDataIndex] of SlotDefType;
   SlotDefPtr = ^SlotDefArType;
   dataType = array[rawDataIndex] of integer;
   dataTypePtr = ^dataType;

   { SlotWindDesc is the description of everything needed to maintain a window }
   { that displays values/names like the Raw window or DM window. }
   SlotDesc = record
      wp: WindowPtr;
      dataPtr: dataTypePtr;
      dataDefPtr: SlotDefPtr;
      maxSlot,                  { max index for these slots. }
      numUsed,                  { number of slots actually used - 1. }
      SlotStart,                { Line to start with in the raw display }
      DispLines: integer;       { Number of lines in the raw display }
      VScrollH: ControlHandle;
      dispHex: boolean;
      MouseProc: ProcPtr;
    end;
   SlotDescPtr = ^SlotDesc;

   diffPtrs = (ByteP, IntP, longP, long);
   ptrsType = record
      case diffPtrs of
        byteP: (
           bp: Ptr
        );
        intP: (
           ip: IntPtr;
        );
        longP: (
           lp: ^longInt;
        );
        long: (
           l: longInt;
        );
    end;
```

```
var {global program stuff}
  Ticks: ^LongInt;
  FileDirty: array[fileType] of boolean;        { true if the file has been changed. }
  CrntvRef: array[fileType] of integer;
  CrntfName: array[fileType] of string;
  DAconfig: DAconfigRec;                         { Data Aq startup configuration. }

  rawData: array[rawDataIndex] of integer;
  rawDataDef: SlotDefArType;
  OutCountPtr: intPtr;        { Pointer to int to increment when routines that output to outside of the mac
     do an output }
                                { Ie: inc this everytime the SGI code sends a change packet. }

  Finished: Boolean;          {used to terminate the program}
  turnKey: Boolean;           { True if running in TurnKey mode }
  HookupFlag: Boolean;        { Set to true when the DM's need to be re hooked up. }
  scriptMHndl,                      {script menu }
  DAMHndl,                          {Data Aqusition menu }
  DMMHndl,                              {Data Massaging menu }
  TreeMHndl,                        {Tree menu }
  RenderMHndl,                          {Render menu if no Tree Menu. }
  WindMHndl,                        {handle to the Window menu. }
  IsaacMHndl,                       {handle to the Isaac menu. }
  FileMHndl,                        {handle to the File menu. }
  FileM2Hndl,                       {handle to the File menu used for turnkey. }
  EditMHndl,                            {handle to the Edit menu. }
  PopUpMenu,                        {handle to the popUp menu}
  tempPopMenu,                      { handle to a temporary popUp menu anyone can use.  Might have stuff
     in it. }
  sixAxisPopMenu: MenuHandle;

  lastPopUp: integer;
  listSize: integer;

  rawTick: LongInt;           { Count value when DataAcquistion executed. }
  messWPtr: WindowPtr;        { pointer to the message window. }
  MessOffPort: GrafPort; { Offscreen port for message window. }
  ClockCurs: CursHandle; {handle to the waiting watch cursor}
  HandCurs: CursHandle;  {handle to the hand cursor. }
  applRes: integer;           { Applications resource file number }
  LastUpTick: LongInt;        { MainEventLoop sets this on mouse up events.  Use this to check for Double
     clicks. }
  IsaacFName: string[40];     { Default Name for the Issac file sent to the SGI. }
  CSTBHandle: Handle;         { Handle to the table used in sine/cosine to angle conversions (AngleProc) }

  {Screen stuff}
  DragArea: Rect;         {holds the area where window can be dragged in}
  GrowArea: Rect;          {holds the area to which a window's size can change}
  Screen: Rect;        {holds the screen dimensions}

  {Window stuff}
  myWindows: array[myWindowTypes] of myWindowRec;
```

```
implementation

end.
```

```
{ Handles input of raw data from one GBII box hooked up to a serial port. }

unit GBIIBox;

interface
 uses
  ChuckStuff, AutoLib, Globals, RawUnit, serialTypes, serialRoutines, DAgloveIO, gloveIOandDMs;

 function GBIIBox (gBox: gloveSerPtr; v: DAverb): integer;

implementation


 function GBIIBox;

  var
   i, j, res, state, test, err: integer;
   prefix: string;
 begin
  i := 4;
  j := 0;
  case v of
   initDA:
     begin
      gBox^.failed := 0;
      setSendBytes(gBox);

      with gBox^.serBlock.dar do
       begin
        GBIIBox := testSuccess;
        if numGloves = 2 then
         prefix := ''
        else
         prefix := StringOf(numGloves - 1 : 1);
        name := 'Sen';
        size := 4;
        if rdGest in DAConfig.bits then
         size := size + 1;
        if rdPolhm in DAConfig.bits then
         size := size + 6;
        if rdGlove in DAConfig.bits then
         size := size + 16;
        FirstSlot := AllocateRaw(name, size);
        if FirstSlot <> -1 then
         begin
          ptrto := @RawData[FirstSlot];
          i := dyNewItem(DAMHndl, concat('Set glove', prefix, ' brightness'), @menuSetBright, true);
          if numGloves = 2 then { this is the first glove box initialized }
           firstSetBrightDy := i;
          for i := 0 to 3 do
           rawDataDef[FirstSlot + i].name := StringOf(prefix, 'GBHead', i + 1 : 1);
          j := 4;
```

```
            if rdGest in DAconfig.bits then
              begin
                rawDataDef[FirstSlot + j].name := StringOf(prefix, 'Gesture');
                j := j + 1;
              end;
            if rdPolhm in DAconfig.bits then
              for i := 1 to 6 do
                begin
                  rawDataDef[FirstSlot + j].name := StringOf(prefix, 'polh', i : 1);
                  j := j + 1;
                end;
            if rdGlove in DAconfig.bits then
              for i := 1 to 16 do
                begin
                  rawDataDef[FirstSlot + j].name := StringOf(prefix, 'Glove', i : 1);
                  j := j + 1;
                end;
          end
        else
          GBIIBox := testFailed;
      end;
    end;
  readDA:
    begin
      test := GetSerial(gBox);
      if test = -1 then
        GBIIBox := -1
      else
        begin
          if test = 1 then
            with gBox^.serBlock.dar do
              begin
                BlockMove(@gBox^.raw, Ptr(ptrto), size * 2);
              end;
          GBIIBox := 0;
        end;
    end;
  resetDA:
    begin
      gBox^.failed := 0;
      ResetDGBox(gBox);
      GBIIBox := 0;
    end;
  closeDA:
    CloseSerial(gBox^.serBlock);
  otherwise
    GBIIBox := -1;
  end;
 end;
end.
```

```
unit DAGloveIO;

interface
  uses
    Serial, CompileTime, ChuckStuff, AutoLib, Globals, serialTypes, serialRoutines, FastStuff,
       MiscRoutines;

  const

{ constants for messages sent to glove boxes }
    gSendRecord = '$C';      { gOneShot command }
    gContinuous60 = '$A';        { 60hz continuous }
    gContinuous30 = '$B';        { 30hz continuous }

    gID = '$D';
    gSizeInfo = '$S';
    gRecSize = chr(16);      {chr(x bytes), where x is the size of the gBox record}
    gReset = '$J';

  var
    DG60hz: Boolean;             { if gOneShot true and DG60hz true request 60hz continuous, else 30h
       continuous. }

  function TestForGBox (gBox: gloveSerPtr; portnum: integer): Boolean;
  procedure SendSizeInfo (GBox: gloveSerPtr);
  procedure ResetDGBox (GBox: gloveSerPtr);
  procedure SetSendBytes (gBox: gloveSerPtr);

implementation

  const

    version = 0;
    blab = false;

  var
    idxCount: integer;

  procedure SetSendBytes;    {Loads leading byte, oneshot, flex, into Sendbytes}
    var
      device, size: integer;
  begin
    if gOneShot then
      gBox^.sendBytes := gSendRecord
    else
      begin
        if DG60hz then
          gBox^.sendBytes := gContinuous60
        else
          gBox^.sendBytes := gContinuous30;
      end;
    with gBox^.serBlock do
      begin
```

```
      device := 0;
      size := 4;
      if rdGest in DAconfig.bits then
        begin
          size := size + 1;
          device := BOR(device, 8);
        end;
      if rdPolhm in DAconfig.bits then
        begin
          size := size + 12;
          device := BOR(device, 2);
        end;
      if rdGlove in DAconfig.bits then
        begin
          size := size + 16;
          device := BOR(device, 1);
        end;
    end;
  gBox^.sendBytes := concat(gBox^.sendBytes, chr(device));
  gBox^.serBlock.reqCount := size;
  gBox^.serBlock.readCount := gBox^.serBlock.reqCount;
 end;

{The following procedure tests the open line for a GloveBox. If it is there }
{then IsAnybodyOutThere sends a reset to the Box and gives TestForGBox a 0.}

 function IsAnybodyOutThere (gBox: gloveSerPtr; portNum: integer): integer;

   var
     runerr, j, foo, i: integer;
     l, q, minNum: longint;
     timeout: boolean;
     errString: str255;
 begin
   runerr := 0;
   IsAnybodyOutThere := -1;
   j := 0;
   gBox^.sendBytes := gID;

   while (j <= 2) do
     begin
       timeout := false;

{for i := 1 to maxSenSize do}
{begin}
{gBox^.inChars[i] := ' ';}
{gBox^.raw[i] := ' ';}
{end;}
{with gBox^.serBlock.serialIn do}
{ioBuffer := @gBox^.inChars;}

        ClearInBuff(gBox^.serBlock.serialIn);
```

```
      runErr := writeOut(gBox^.serBlock, gBox^.sendBytes, false, SlowWait);
      if runerr <> noErr then
        announce(stringof('Glove box PBWrite error # ', runerr : 1, '.'));

      I := 0;
      q := Ticks^;
      while (I < 2) and not timeout do
        begin
          runerr := SerGetBuf(gBox^.serBlock.serialIn.ioFRefNum, I);      {ADD SOME ERROR REPTNG}
          if (Ticks^ >= q + 45) then  { it's been too long, get out of this loop }
            timeout := true;
        end;
      if I > 0 then
        begin
          minNum := MinOf(I, 10);
          runerr := readIn(gBox^.serBlock, ptr(@gBox^.inChars), minNum, false);
        end;

      if blab then
        announce(stringof('Reading ', I : 1, ' bytes.'));

      if (I > 1) and (gBox^.inChars[1] = '$') and (gBox^.inChars[2] = 'D') and not timeout then
        begin
          IsAnybodyOutThere := 0;
          gBox^.myPort := currentPortNum;
          resetDGBox(gBox);
          j := 10;
        end
      else
        begin
          j := j + 1;
        end;
    end;
{*****Report error - we've  tried to open this line four times now*****}
   if (j <= 2) or (timeout) then
     begin                              { and report the error to The Guy}
       {realPortNames(gBox^.myPort,  errString);}
       {Announce(StringOf('The GloveBox has not responded on the ', errString));}
     end;
   setSendBytes(gBox);          {changes send bytes from $D (ID)  to $C  (send data)  }
  end;


  {This Function Tests to see if a GloveBox is }
  {alive and well on the modem port.            }

  function TestForGBox;      {(gBox:gloveSerPtr;  portnum: integer): Boolean;}
    var
      isItThere:  Integer;
      str:  str255;
  begin

    setUpPort(portNum,  gBox^.serBlock);
```

```
    setUpSerialRec(gBox^.serBlock);

    if not gOneShot then
      gBox^.serBlock.GlobBuff := @gBox^.inChars;

    if openADriver(gloveBaudR, 'Glove Box', gBox^.serBlock, false) then
      isItThere := IsAnybodyOutThere(gBox, portNum)
    else
      isItThere := -1;
    if isItThere < 0 then
      begin
{Announce('TestForGBox failed.');}
      end
    else
      begin
        str := UserPortName(gBox^.myPort);
{$ifc Debug }
        AliveAndWell('Glove Box', str);
 {$elsec }
        Announce(stringOf('Glove Box alive and well on ', str));
 {$endc }
      end;
    if isItThere < 0 then
      TestForGBox := false
    else
      TestForGBox := true;
  end;


  procedure SendSizeInfo;              {(GBox: gloveSerPtr);}
    var
      runerr: integer;
  begin
    runerr := 0;
    gBox^.sendBytes := concat(gSizeInfo, gRecSize);
    runerr := writeOut(gBox^.serBlock, gBox^.sendBytes, false, SlowWait);

    { Ignore the reply }
    ClearInBuff(GBox^.serBlock.SerialIn);
  end;


  procedure ResetDGBox;       {var gBox:glovePtr);}
    var
      runerr: integer;
      l: longint;
  begin
    runerr := 0;

    { Send a reset to the box }
```

```
    gBox^.sendBytes := gReset;
    runerr := writeOut(gBox^.serBlock, gBox^.sendBytes, false, SlowWait);
    { wait for a sec after reset. }
    I := Ticks^;
    while I + 60 > Ticks^ do
      ;
    { Clear the mac input buffer and set ioCompletion to nil. }
    ClearInBuff(gBox^.serBlock.Serialin);
    SendSizeInfo(gBox);

    { Prime the box by sending a read request. }

    if not gOneShot then
      begin
        gBox^.serBlock.SerialIn.ioCompletion := @ReadCompletion;
        gBox^.serBlock.GlobBuff := @gBox^.inChars;
      end;

    SetSendBytes(gBox);
    runerr := writeOut(gBox^.serBlock, gBox^.sendBytes, false, SlowWait);
    gBox^.lastResponse := Ticks^;

    if not gOneShot then
      begin
        { If not gOneShot the prime the read cycle by issuing the first async read. }
        gBox^.serBlock.rFlag := 0;
        with gBox^ do
          runerr := readIn(serBlock, @serBlock.interruptBuff, serBlock.readCount, true);
      end;
  end;

end.
```

```
unit gloveIOandDMs;

interface
 uses
  Serial, ChuckStuff, AutoLib, Globals, serialTypes, serialRoutines, DAGloveIO, FastStuff, MiscRoutines;

 var
  firstSetBrightDy: integer;     { DyItem number for the first Set Brightness dynamic menu.  Compare
      this }
                                 { to the dyItem passed to menuSetBright to determine which glove box
      to set. }

 function GetSerial (GBox: gloveSerPtr): integer;
 function SetBright (GBox: gloveSerPtr; newBright: integer): boolean;
 procedure menuSetBright (dyItem: integer);


implementation

 const

  version = 0;
  blab = false;
  gFastWait = 1000;
  gSlowWait = 5000;

 var
  idxCount: integer;


 procedure MoveBytesAndPolhm (gBox: gloveSerPtr);
{ InChars has 32 bytes. }
{ Header: 1-4, pohlemus 5-16, glove 17-32 }
{ Unpack the header and glove, and swap the pohlemus.  Leave it all in RawSensor }
  type
   pcharsType = packed array[1..12] of char;
  var
   i: integer;
   charsPtr: ^pcharsType;
 begin

  for i := 1 to 4 do                                        { move the header in and unpack it. }
   gBox^.raw[i] := gBox^.InChars[i];
  charsPtr := @gBox^.raw[5];

  blockmove(ptr(@gBox^.inchars[5]), @gBox^.raw[5], 12);   { move the polhemus bytes in as is }

  SwapBytes(@gBox^.raw[5], 6);                              { and then swap the order of the pairs. }

  for i := 1 to 16 do                                       { move the glove record in and unpack it.
    }
   gBox^.raw[10 + i] := gBox^.InChars[16 + i];
 end;
```

```
 procedure MoveBytes (gBox: gloveSerPtr);
{ Inchars has x bytes. }
{ Header=4,  Gest=1, Polhm=12, Glove=16 }
{ The Gest, Polhm and Glove may or may not be there. }
{ Unpack the header gest and glove, swap the pohlemus.  Leave it all in raw. }
   var
    i, byteIdx, intIdx: integer;
  begin
   for intIdx := 1 to 4 do                          { move the header in and unpack it. }
    gBox^.raw[intIdx] := gBox^.InChars[intIdx];
   intIdx := 5;
   byteIdx := 5;
   if rdGest in DAconfig.bits then
    begin
     gBox^.raw[intIdx] := gBox^.InChars[byteIdx];
     intIdx := intIdx + 1;
     byteIdx := byteIdx + 1;
    end;
   if rdPolhm in DAconfig.bits then
    begin
     blockmove(ptr(@gBox^.inchars[byteIdx]), @gBox^.raw[intIdx], 12);    { move the polhemus bytes in
      as is }
     SwapBytes(@gBox^.raw[intIdx], 6);                    { and then swap the order of the
      pairs. }
     intIdx := intIdx + 6;
     byteIdx := byteIdx + 12;
    end;
   if rdGlove in DAconfig.bits then
    begin
     for i := 0 to 15 do                           { move the glove record in and unpack
      it. }
      gBox^.raw[intIdx + i] := gBox^.InChars[byteIdx + i];
    end;
  end;


  function OneShotGetSerial (gBox: gloveSerPtr): integer;
   var
    idx, runerr, i: integer;
    l, debugTicks: longint;
    portName: str255;
    serSta: serStaRec;
    x: integer;
  begin
   OneShotGetSerial := 0;
   if gBox^.lastResponse + 2 > Ticks^ then
    exit(OneShotGetSerial);

   idx := 1;
   runerr := 0;
   runerr := SerGetBuf(gBox^.serBlock.SerialIn.ioRefNum, l);
```

```
if I >= gBox^.serBlock.reqCount then
  begin
    runerr := readln(gBox^.serBlock, ptr(@gBox^.inChars), gBox^.serBlock.reqCount, false);

    MoveBytes(gBox);
    OneShotGetSerial := 1;

    runerr := writeOut(gBox^.serBlock, gBox^.sendBytes, false, gSlowWait);

    if false then
      begin
        runerr := SerStatus(gBox^.serBlock.serialIn.ioRefNum, serSta);
        if (serSta.cumErrs <> 0) then
          announce('cumulative errors is greater than 0');
      end;

    gBox^.lastResponse := Ticks^;
  end
else if (I < gBox^.serBlock.reqCount) then
  begin
    if blab then
      announce(stringOf('OneShotGetSerial: bytes here = ', I : 1));
    if (Ticks^ > gBox^.lastResponse + 75) then
      begin
        debugTicks := Ticks^;
        if blab then
          announce(stringOf('elapsed time:  ', Ticks^ - gBox^.lastResponse));

        portName := UserPortName(gBox^.myPort);

        if gBox^.failed >= 3 then
          begin
            ResetDGBox(gBox);
            AnnounceB(stringof('The Glove Box on ', portName, ' has timed out.'));
            Announce('Try resetting to establish communications. ');
            announce('');
            OneShotGetSerial := -1;
          end
        else
          begin
            runerr := readln(gBox^.serBlock, ptr(@gBox^.inChars), I, false);
            AnnounceB(stringof('Warning: The Glove Box on ', portName, ' only sent ', I : 1, ' chars. '));
            ResetDGBox(gBox);
            gBox^.failed := gBox^.failed + 1;
          end;
      end;
  end;
end;{get serial }

{ Not gOneShot mode, this is GetSerial for continuous sending. }
function ContGetSerial (gBox: gloveSerPtr): integer;
  var
```

-000424

```
    idx, runerr, i: integer;
    l, debugTicks: longint;
    portName: str255;
    serSta: serStaRec;
    x: integer;
  begin
   ContGetSerial := 0;
   if gBox^.lastResponse + 2 > Ticks^ then
     exit(ContGetSerial);

   idx := 1;
   runerr := 0;
   if gBox^.SerBlock.rFlag <> 0 then
     begin
       MoveBytes(gBox);
       ContGetSerial := 1;

       gBox^.serBlock.rFlag := 0;      { Clear flag that say's we got a new buffer }

       if false then
         begin
           runerr := SerStatus(gBox^.serBlock.serialIn.ioRefNum, serSta);
           if (serSta.cumErrs <> 0) then
             announce('cumulative errors is greater than 0');
         end;

       gBox^.lastResponse := Ticks^;
     end
   else if (Ticks^ > gBox^.lastResponse + 75) then
     begin
       debugTicks := Ticks^;
       if blab then
         announce(stringOf('elapsed time:  ', Ticks^ - gBox^.lastResponse));

       portName := UserPortName(gBox^.myPort);

       if gBox^.failed >= 3 then
         begin
           ResetDGBox(gBox);
           AnnounceB(stringof('The Glove Box on ', portName, ' has timed out.'));
           Announce('Try resetting to establish communications.');
           announce('');
           ContGetSerial := -1;
         end
       else
         begin
           AnnounceB(stringof('Warning: The Glove Box on ', portName, ' isn''t responding.'));
           ResetDGBox(gBox);
           gBox^.failed := gBox^.failed + 1;
         end;
     end;
  end;{get serial }
```

```
function GetSerial (gBox: gloveSerPtr): integer;
begin
  if gOneShot then
    GetSerial := OneShotGetSerial(gBox)
  else
    GetSerial := ContGetSerial(gBox);
end;

function Waitfor (gBox: gloveSerPtr; count, duration: integer): boolean;
  var
    l, t: longInt;
    err: integer;
begin
  t := Ticks^;
  repeat
    err := SerGetBuf(gBox^.serBlock.SerialIn.ioFRefNum, l);
  until (l >= count) or (Ticks^ > t + duration);
  WaitFor := (l >= count);
end;

function SetBright; { (gBox:gloveSerPtr; newBright : integer):boolean }
  { Set the brightness level of the DG2 box to the given value.  This is called by the }
  { Brightness DM.  It does no prompting.  Return true if successful. }
  var
    brightStr: string;
    err: integer;
begin
  SetBright := false;
  if WaitFor(gBox, gBox^.serBLock.reqCount, 30) then
    begin
      ClearInBuff(gBox^.serBlock.SerialIn);
      brightStr := concat('$M', chr(newBright));
      err := WriteOut(gBox^.serBlock, brightStr, false, SlowWait);
      if err = noErr then
        begin
          err := writeOut(gBox^.serBlock, gBox^.sendBytes, false, SlowWait);
          gBox^.lastResponse := Ticks^;
        end;
      SetBright := (err = noErr);
    end;
end;

procedure menuSetBright (dyItem: integer);
{ Called by dynamic menu for a particular glove box (determined by comparing dyItem to firstSetBrightDy) }
{ Send a command to the DG2 box to set it brightness. }
  const
    QueryCmd = '$H';
  var
    gBox: gloveSerPtr;
    err: integer;
    l, t: longInt;
    dim, bright: longInt;
    dimStr, brightStr, dimPrompt: str255;
```

```
   chars: packed array[1..20] of char;
 begin
  gBox := gBoxes[dyItem - firstSetBrightDy + 1];
  if WaitFor(gBox, gBox^.serBlock.reqCount, 30) then
   begin
    ClearInBuff(gBox^.serBlock.SerialIn);
    err := WriteOut(gBox^.serBlock, QueryCmd, false, SlowWait);
    if WaitFor(gBox, 4, 30) then
     begin
      with gBox^.serBlock.SerialIn do
       begin
        ioBuffer := @Chars;     {Pointer(@inChars[idx]);}
        ioReqCount := 4;
       end;
      err := PBRead(@gBox^.serBlock.SerialIn, false);
      dimStr := ntos(ord(chars[3]));
      brightStr := ntos(ord(chars[4]));
      dimPrompt := 'Set new intensities for dim and bright.';
      dimPrompt := concat(dimPrompt, chr(13), 'Dim');
      if GetStrings(dimPrompt, concat(chr(13), 'Bright'), dimStr, brightStr) then
       begin
        StringtoNum(dimStr, dim);
        dimStr := concat('$N', chr(dim));
        err := WriteOut(gBox^.serBlock, dimStr, false, SlowWait);

        StringtoNum(brightStr, bright);
        brightStr := concat('$M', chr(bright));
        err := WriteOut(gBox^.serBlock, brightStr, false, SlowWait);
       end;
      err := writeOut(gBox^.serBlock, gBox^.sendBytes, false, SlowWait);
      gBox^.lastResponse := Ticks^;
     end;
   end;
 end;      { SetBright }

end.
```

```
unit HandleDMs;
interface
  uses
    ChuckStuff, AutoLib, Globals, {}
    Tree3DGlob, MiscRoutines, RawUnit, formTree3D, {}
    Tree3D, DMTypes, DMGlobals, SomeDMs, DG2Bright, TimeDMs, SimpleDMs, RobotDMs;

  var
    doAllDMs: boolean;       { If false all dm's are turned off. }
    NotOrdered: integer;     { Number of times the DM list has not been ordered. }
    StructPtrSet: DSet;      { Set of datatypes that are larger than 4 bytes and so are passed by ptr. }


  procedure doVerb (v: DMVerb; var dm: DMRec);
  procedure doMassage (var dm: DMRec);
  function FindDM (name: nameStr; forDM: boolean): integer;
  function DMNameInUse (var suf: SuffixType): boolean;
  function UniqueDMName (name: NameStr): NameStr;
  procedure HandleDMMenus (publicItem: integer);
  procedure HookupIO (var dm: DMRec);
  procedure HookupAllDMs;
  procedure ReorderDMs (always: boolean);
  procedure CheckDMsOrder (index: integer);
  procedure SetDisplay (var dm: DMRec; add: boolean);
  procedure WriteDMCode;

{ callMassage calls the massage procedure for this DM module.  It just places code }
{ inline that pulls the address off the stack and jsr's to it. }
{ All DM modules have a massage procedure.  If one isn't specified }
{ the address of doMassage is used. }
  procedure callMassage (var dm: DMRec; procPtr: Ptr);
  inline
    $205F,   { move.l  (a7)+,a0  }
    $4E90;   { jsr     (a0)      }
{ CallResDM does the same for a resource DM. }
  procedure CallResDM (v: DMVerb; var dm: DMRec; DMinfo: DMInfoType; proc: ProcPtr);
  inline
    $205F,   { move.l  (a7)+,a0  }
    $4E90;   { jsr     (a0)      }


implementation

  const
    AlwaysReorder = false;        { If true always reorder the DM's on edits, else just when the user says
       so. }


  procedure callDMVerb (v: DMVerb; var dm: DMRec; proc: ProcPtr);
  inline
    $205F,   { move.l  (a7)+,a0  }
    $4E90;   { jsr     (a0)      }
```

```
{-------------------------------------------------------}
{ doVerb is given a DataMassage verb and a record with the DMType in it. }
{ route the verb/record to the correct code for this type. }
 procedure doVerb; { (v : DMVerb; var dm : DMRec) }
 begin
   if DMTypes[dm.typeIdx].codeRes then
     begin
       Announce(StringOf('callResDM: v = ', v));
       callResDM(v, dm, DMInfo, dm.massageProc);
     end
   else
     callDMVerb(v, dm, DMTypes[dm.typeIdx].verbProc);
 end;    { doVerb }

{-------------------------------------------------------}
 procedure doMassage; { (var dm : DMRec) }
 begin
   doVerb(massageDM, dm);
 end;

{-------------------------------------------------------}
 procedure HandleDMMenus; { (publicItem : integer) }
{ publicItem is an identifier for a dynamic menu item in the DM menu. Search through }
{ all the current DM's looking for the identifier. If found send a menuHitDM message to }
{ the DM. }
   var
     i: integer;
     found: boolean;
  begin
   found := false;
   for i := 0 to numOfDMRec do
     if not found then
       if DMRecsPtr^[i].dyMenuItem = publicItem then
         begin
           doVerb(menuHitDM, DMRecsPtr^[i]);
           found := true;
           DMCodeInvalid := true;
         end;
  end;

{-------------------------------------------------------}
{ Find the index into the DMRecsPtr^ array for the given name. return -1 if not found. }
{ If forDM is true search all the DM's for this name, else search the DM types for this name. }
  function FindDM (name: nameStr; forDM: boolean): integer;
    var
      i, limit: integer;
      found: boolean;
  begin
    if forDM then
      limit := numOfDMRec
    else
      limit := topDMType;
```

```
    i := 0;
    found := false;
    while not found and (i <= limit) do
      begin
        if forDM then
          found := EqualString(DMRecsPtr^[i].name, name, false, false)
        else
          found := EqualString(DMTypes[i].name, name, false, false);
        if not found then
          i := i + 1;
      end;
    if found then
      FindDM := i
    else
      FindDM := -1;
  end;    { FindDM }

  function DMNameInUse (var suf: SuffixType): boolean;
      { Return true if this name is in use in the DM list. }
    var
      j: integer;
  begin
    j := FindDM(AddSuffix(suf), true);        { Name already in use in the DM list? }
    DMNameInUse := (j <> -1);
  end;

  function UniqueDMName (name: NameStr): NameStr;
    { Make a unique DM name out of the given name. }
    var
      suf: SuffixType;
  begin
    ExtractSuffix(name, suf);
    if DMNameInUse(suf) then
      begin                 { If already in use make new unique name. }
        suf.n := 1;
        while DMNameInUse(suf) do
          suf.n := suf.n + 1;
      end;
    UniqueDMName := AddSuffix(suf);
  end;

  function HookupInputs (dmp: DMRecPtr): DMmodState;
{ Hook up the inputs to this Data Massage module. If the hookup is successful }
{ then return the state 'on' and set the DM to 'on', else set the DM to 'off'. }
    var
      i, j: integer;
      state: DMmodState;
      p: PRecPtr;
      tPtr: ^DMTypeRec;
      pData: DType;             { used to say what kind of data an input points at. }
      inTypes: DSet;
  begin
    tPtr := @DMTypes[dmp^.typeIdx];
```

```
state := on;
for i := 0 to dmp^.inputs - 1 do
  begin
    inTypes := tPtr^.inTypes[i];
    if [sameD] = inTypes then
      begin          { If input must be same as output then set intypes to output type. }
        case tPtr^.inputs of
          -1:
            inTypes := [dmp^.PointsOut[0].outType];         { must be same as first output }
          -2:
            inTypes := [dmp^.PointsOut[i div 2].outType];
          -3:
            inTypes := [dmp^.PointsOut[i div 3].outType];
          otherwise
            inTypes := [dmp^.PointsOut[i].outType];
        end;
      end;
    dmp^.SlotsIn[i].ptrfrm := nil;
    if state = on then
      with dmp^.SlotsIn[i] do
        begin
          pData := undefD;
          if name <> '' then
            case kind of
              frmRaw:            { This input is from the rawData array. }
                begin
                  pData := intD;
                  if intD in inTypes then
                    begin
                      j := FindRaw(name, @ptrfrm);
                      if j <> -1 then
                        begin
                          ptrfrm := Pointer(StripAddress(@rawData[j]));
                          inType := intD;
                        end;
                    end;
                end;
              frmTree:
                begin                        { This input is from somewhere in the tree. }
                  if [intD, pointD] * inTypes <> [] then
                    begin
                      p := FindTreeName(mainTreePtr, name);{ find the node. }
                      if p <> nil then
                        begin
                          pData := intD;
                          if intD in inTypes then
                            begin
                              ptrfrm := Pointer(StripAddress(@p^.ISix.s[inIdx]));   { either addr of the
  particular integer. }
                              inType := intD;
                            end
                          else if pointD in inTypes then
                            begin                      { or of the point. }
```

```
                        ptrfrm := Pointer(StripAddress(Ptr(p)));
                        inType := pointD;
                      end;
                    end;
                  end;
                end;
              frmDM:
                begin
                  j := FindDM(name, true);
                  if j <> -1 then
                    with DMRecsPtr^[j].PointsOut[inIdx] do
                      begin
                        pData := outType;
                        if outType in inTypes then
                          begin
                            inType := outType;
                            if inType in structPtrSet then
                              dmp^.SlotsIn[i].ptrfrm := Pointer(StripAddress(Ptr(LastValue)))     { If
lastvalue is a ptr, use it }
                            else
                              dmp^.SlotsIn[i].ptrfrm := Pointer(StripAddress(@LastValue));   { else set ptr
to lastvalue }
                          end;
                      end;
                end;
            end;      { case }
          if ptrfrm = nil then
            begin     { This input wasn't found, turnoff module. }
              state := off;
              if not (pData in (inTypes + [undefD])) then
                Announce(StringOf('Input #', i + 1 : 1, ' can''t be from type ', pData, '. Module ''',
dmp^.name, ''' turned off.'))
              else if dmp^.state = on then     { If it was on, then say it's turned off. }
                Announce(StringOf('Input ''', name, ''' not found. Module ''', dmp^.name, ''' turned off.'));
            end;
        end;          { with dmp^, if state }
    end;              { for i }
  if dmp^.state <> usrOff then
    dmp^.state := state;
  HookupInputs := state;
end;

function HookupOutputs (var dm: DMRec): DMmodState;
{ Hook up the outputs to this Data Massage module. If the hookup is not successful }
{ then set ptrto = nil. Always return successful }
  var
    i, j: integer;
begin
  for i := 0 to dm.outputs - 1 do
    with dm.PointsOut[i] do
      if dm.state = on then
        begin
          if name = '' then
```

```
        ptrto := nil
      else
        begin                   { find this output in the tree. }
          ptrto := Pointer(StripAddress(Ptr(FindTreeName(mainTreePtr, name)))); { find the node. }
          if (ptrto = nil) and (dm.state = on) then
            begin               { no node found. }
              Announce(StringOf('Output "', name, '" not found in module ', dm.name, '.'));
            end;
        end;
    end
   else if outType in StructPtrSet then
     LastValue.p := nil;
  HookupOutputs := on;
end;    { HookupOutputs }

procedure HookupIO (var dm: DMRec);
  var
    state: DMmodState;
begin
  state := HookupInputs(@dm);
  if state = on then
    state := HookupOutputs(dm);
  dm.massageProc := DMTypes[dm.TypeIdx].massageProc;
  EnDisDMmenu(dm);
  if dm.state = on then
    doVerb(reHookedDM, dm);
  if not dm.turnsOnOff then
    begin       { If this isn't a DM that turns on and off alot then make written code invalid. }
      DMCodeInvalid := true;
    end;
end;

  { This procedure is here so dm's that get turned on/off alot can be tagged and in the code generated this }
  { routine will be called instead of the dm directly.  If it is off then it won't be called.  That way the entire
      code }
  { doesn't have to be rewritten when a dm is turned on/off. }
procedure Call_If_On (var dm: DMRec);
begin
{•  Announce(concat(' Call_If_On: ', dm.name));•}
  with dm do
    if state = on then
      if DMTypes[typeIdx].codeRes then
        callResDM(massageDM, dm, DMInfo, massageProc)
      else
        callMassage(dm, massageProc);
end;

procedure WriteDMCode;
{ Write the code nessesary to execute all the DM's where they are.  For each DM pass a message }
{ telling it to write it's own code.  If it doesn't writie any then just add a call to it.  }
  var
    i, lastNext: integer;
  begin
```

```
  if false then
    Announce('Writing code...');
  NextWord := 0;
  if CallDMCode then
    CallDMCode := (CodeHandle <> nil);
  Add_Word($48E7);        {movem.l  d2-d7/a2-a4,-(sp)}
  Add_Word($3F38);
  for i := 0 to numOfDMRec do
    begin
      if DMRecsPtr^[i].turnsOnOff then
        begin
            { If this DM turns on and off alot then insert code to continually check its state. }
          Add_Word(PUSH_IML_Op);      { push dm addr }
          Add_Addr(@DMRecsPtr^[i]);
          Add_Word(JSR_ABS_Op);       { jsr to Call_If_On }
          Add_Addr(@Call_If_On);
        end
      else if DMRecsPtr^[i].state = on then
        begin
          lastNext := NextWord;
          doVerb(WriteCodeDM, DMRecsPtr^[i]);
          if lastNext = NextWord then   { The DM didn't write any code, }
            AddDMCall(DMRecsPtr^[i]);   { just add a call to it. }
        end;
      if NextWord + 32 > GetHandleSize(Handle(CodeHandle)) div 2 then
        begin
          AnnounceB('DM code space full.');
          CallDMCode := false;
          leave;
        end;
    end;
   if CallDMCode then
    begin
      Add_Word($4CDF);            {movem.l  (sp)+,d2-d7/a2-a4}
      Add_Word($1CFC);
      Add_Word(RTS_Op);
    end;
   if windowOn(DMSlotDesc.wp) then
    CallDMCode := false
 end;

 procedure HookupAllDMs;
{ Make sure all the dm modules are hooked up properly. }
{ This routine can be called as often as you want.  In fact calling it more is better }
{ than calling it less than you need. ReHookupDMIO in dataMassage.pas just calls this. }
   var
     i, j: integer;
 begin
   SetCursor(ClockCurs^^);
   if numOfDMRec <> -1 then
     for i := 0 to numOfDMRec do
       HookupIO(DMRecsPtr^[i]);
   DMCodeInvalid := true;
```

```
  InitCursor;
end;

function MaxPointsTo (dmIdx: integer): integer;
  { Return the highest numbered DM that the given DM's inputs point to, either by directly pointing, or }
  { by this DM pointing to a tree that is used by another DM.  If this DM doesn't point to another then }
  { return -1. }
  var
    depIdx, moveto, inNum, t1: integer;
begin
  moveto := -1;
    { For DM[dmIdx], find the furthest down location to move to. }
  with DMRecsPtr^[dmIdx] do
    for inNum := 0 to inputs - 1 do
      begin          { if any inputs point down the list }
        if SlotsIn[inNum].kind = frmDM then
          begin
            depIdx := FindDM(SlotsIn[inNum].name, true);
            if (depIdx > moveto) and (depIdx > dmIdx) then    { then move to the furthest down. }
              moveto := depIdx;
          end
        else if SlotsIn[inNum].kind = frmTree then
          begin
              { This input from a tree.  If any other DM outputs to the tree pos then this DM should be below
      it. }
            for depIdx := 0 to numOfDMRec do
              begin     { search the DM list }
                for t1 := 0 to DMRecsPtr^[depIdx].outputs - 1 do { and outputs of each DM }
                  if SlotsIn[inNum].inIdx = ord(DMRecsPtr^[depIdx].PointsOut[t1].SixAxis) then
                    if SlotsIn[inNum].name <> '' then
                      if EqualString(SlotsIn[inNum].name, DMRecsPtr^[depIdx].PointsOut[t1].name, false,
      false) then
                        begin
                              { output is same axis and name as input, check if output DM is above input DM
      }
                          if (depIdx > moveto) and (depIdx > dmIdx) then
                            begin
                              moveto := depIdx;    { output DM (depIdx) is below input DM (dmIdx), move
      dmIdx. }
                            end;
                        end;

              end;
          end;
      end;
  MaxPointsTo := moveto;
end;

procedure ReorderDMs (always: boolean);
{ Reorder the DM list so that any DM's that point to other DM's are down the list }
{ from the ones they point to.  This is so any new inputs that are propagating through }
{ multilple DM's will happen in one cycle. }
{ 2/9/89, CLB - Fixed so if a DM gets input from a tree point and another DM }
```

```
{ outputs to that tree point (same axis) then The first DM will be moved to below }
{ the DM is is indirectly dependant on. }
{ 6&7/89, CLB - Added the always flag and checking for doAllDMs so reorder wouldn't }
{ happen if it wasn't necessary. }
    var
      k, t1, dmIdx, inNum, depIdx, moveto: integer;
      tempDM: DMRec;
      moveCount: integer;
  begin
    if not doAllDMs then                                    { Never reorder if dm's are turned off. }
      exit(ReorderDMs);
    if not (AlwaysReorder or always) then
      begin           { Else if not always then see how many }
        NotOrdered := NotOrdered + 1;                       { times it's been since the last reorder. }
        if NotOrdered < 10 then
          begin                       { If less than ten then don't worry about it. }
            HookupAllDMs;
            exit(ReorderDMs);
          end;
      end;

    Announce('Reordering DM''s...');
    NotOrdered := 0;
    SetCursor(ClockCurs^^);
    dmIdx := 0;
    moveCount := 0;
    while dmIdx <= numOfDMRec do           { walk down the DMrec list. }
      begin
        moveto := -1;
        { For DM[dmIdx], find the furthest down location to move to. }
        with DMRecsPtr^[dmIdx] do
          for inNum := 0 to inputs - 1 do
            begin         { if any inputs point down the list }
              if SlotsIn[inNum].kind = frmDM then
                begin
                  depIdx := FindDM(SlotsIn[inNum].name, true);
                  if (depIdx > moveto) and (depIdx > dmIdx) then    { then move to the furthest down. }
                    moveto := depIdx;
                end
              else if SlotsIn[inNum].kind = frmTree then
                begin
                { This input from a tree. If any other DM outputs to the tree pos then this DM should be below
    it. }
                  for depIdx := 0 to numOfDMRec do
                    begin     { search the DM list }
                      for t1 := 0 to DMRecsPtr^[depIdx].outputs - 1 do { and outputs of each DM }
                        if SlotsIn[inNum].inIdx = ord(DMRecsPtr^[depIdx].PointsOut[t1].SixAxis) then
                          if SlotsIn[inNum].name <> '' then
                            if EqualString(SlotsIn[inNum].name, DMRecsPtr^[depIdx].PointsOut[t1].name, false,
    false) then
                              begin
                                   { output is same axis and name as input, check if output DM is above input DM
    }
```

```
                    if (depIdx > moveto) and (depIdx > dmIdx) then
                      begin
                        moveto := depIdx;   { output DM (depIdx) is below input DM (dmIdx), move
dmIdx. }
                      end;
                    end;

              end;
            end;
          end;  { with DMRecsPtr^[dmIdx], for inNum, if frmDM }
        if (moveto <> -1) then
          if moveCount > 20 then        { if you already moved this many }
            moveto := -1                { then it must be a circular thing. }
          else
            begin
              moveCount := moveCount + 1;
              tempDM := DMRecsPtr^[dmIdx];              { save the pointer rec, }
              for k := dmIdx + 1 to moveto do    { move all the rec's including }
                DMRecsPtr^[k - 1] := DMRecsPtr^[k]; { the pointed to rec up, }
              DMRecsPtr^[moveto] := tempDM;     { and put pointer right after pointed to. }
            end;
        if moveto = -1 then                 { if no moveto the incrment dmIdx }
          begin
            dmIdx := dmIdx + 1;                     { and keep working }
            moveCount := 0;
          end;
      end;        { while dmIdx <= numOfDMRec }
    HookupAllDMs;           { Since things have been moved fix up the hookups }
    InitCursor;
  end;    { ReorderDM's }

  procedure CheckDMsOrder; { (index: integer) }
    { Check to see if the DM at the given index is ordered.  (It's inputs are from lower numbered DM's }
    { than it is.  If not then reorder all the DM's. }
    var
      i: integer;
  begin
    if MaxPointsTo(index) > index then
      ReorderDMs(true)
    else
      HookupIO(DMRecsPtr^[index]);
  end;

  procedure SetDisplay; { (var dm : DMRec; add : boolean) }
{ Set the display array up for this dm.  If add is true the allocate space for }
{ this DM.  If it is false and this dm has space allocated then deallocate it. }
    var
      i: integer;
  begin
    if not turnkey then
      with dm do
        begin
          if add then
```

```
          displdx := AllocateSlots(DMSlotDesc, name, outputs)
        else if displdx >= 0 then
          begin     { Deallocate space this DM might have. }
            for i := displdx to displdx + (outputs - 1) do
              begin
                DMDataDef[i].name := '';
                DMSlotDesc.dataPtr^[i] := -1;
              end;
          end;
        SlotUpdate(DMSlotDesc);
      end;
  end;

end.
```

```
{--------------------------------------------------------}
{ Handle the Host Communications used to interface the DataSuit   }
{ program with a SGI for PDI.  }
{--------------------------------------------------------}

{ Copyright 1987 VPL Research, Inc. }
{ Chuck Blanchard 7/12/88 }

unit HostCom;

interface

  uses
    Serial, CompileTime, AutoLib, ChuckStuff, FastStuff, Globals, {}
    Tree3DGlob, serialTypes, serialRoutines, formTree3D, Tree3D,{}
    DMTypes, DMGlobals, DMFileIO, DataMassage, Scripts;

{$ifc DoHost }
  var
    HostOn: boolean;            { True if host port opened ok. }

  procedure CheckHost; { check for char from host.  If command then send it. }
  procedure OpenHost (portNum: integer);
  procedure CloseHost;

{$endc }

implementation

{$ifc DoHost }

  const
    serBuffLen = 1024;
    sendOutLen = 512;
    HardHandShake = true;

  var
    cmdStr:  str255;
    toHostFname,              { File name to use to open the host out port. }
    frmHostFname: string[6]; { File name to use to open the host in port. }
    toHostRef,                { file RefNum for the host ouput channel. }
    frmHostRef: integer;    { file RefNum for the host input channel. }
    acting: boolean;          { true if currently acting like an SGI. }
    configNum: integer;
    HostMenu: MenuHandle;
    SendChanges: Boolean;      { true if sending all changes, else send just checked nodes. }
    Delta: Boolean;            { If true ask for bytesized records. }

    startDy, stopDy: integer;      { start and stop Dynamic item numbers. }
    tohostPB: ParamBlockRec;
    tohostPBPtr: ParmBlkPtr;
    strEndChars, validChars: set of char;
```

```
  hostbuff: packed array[0..50] of char;     { buffer of chars HostSend sends. }
  makeString: boolean;
  serOutBuff: packed array[0..serBuffLen] of char;
  serInBuff: packed array[0..serBuffLen] of char;
  sendoutBuff: packed array[0..sendOutLen] of char;

    { The following are all global variables for getting partial records in get_partial. }
  GetState: (GotDone, GetHigh, Getting); { Either done reading in a record, get the next index word, or get
      the values. }
  GotHigh: integer;                    { current (sixAxis bits) + ( Index# ) }
  GetIndex: integer;                   { Current index (0..5) working on. }
  GetP: PRecPtr;                       { Ptr to the actual point the values currently being got are
      affecting. }
  GetRTime: longInt;                   { Time it was (in jiffies) when the last 'R' was written out to
      get a new record. }

{ buffer so I can see the bytes that came in. }
 const
  bugBuffSize = 2048;
 var
  inbytes: packed array[0..bugBuffSize] of byte;
  byteptr: integer;
  verbose: boolean;

{ Write the given string out to the host. }
 function WriteStrOut (str: string): integer;
  var
   count: longInt;
 begin
  count := length(str);
  WriteStrOut := FSWrite(toHostRef, count, Ptr(ord4(@str) + 1));
 end;

 procedure CheckStatus;
  var
   err: integer;
   serSta: serStaRec;
 begin
  err := SerStatus(frmHostRef, serSta);
  if err = 0 then
   with serSta do
    if BitAnd(cumErrs, swOverrunErr + parityErr + hwOverrunErr + framingErr) <> 0 then
     begin
      if BitAnd(cumErrs, swOverrunErr) <> 0 then
       Announce('HostErr: input Software overrun.');
      if BitAnd(cumErrs, parityErr) <> 0 then
       Announce('HostErr: input Parity error.');
      if BitAnd(cumErrs, hwOverrunErr) <> 0 then
       Announce('HostErr: input Hardware overrun.');
      if BitAnd(cumErrs, framingErr) <> 0 then
       Announce('HostErr: input Framing error.');
      err := SerReset(frmHostRef, configNum);
     end;
```

```
   err := SerStatus(toHostRef, serSta);
   if err = 0 then
     with serSta do
       if BitAnd(cumErrs, swOverrunErr + parityErr + hwOverrunErr + framingErr) <> 0 then
         begin
           if BitAnd(cumErrs, swOverrunErr) <> 0 then
             Announce('HostErr: output Software overrun.');
           if BitAnd(cumErrs, parityErr) <> 0 then
             Announce('HostErr: output Parity error.');
           if BitAnd(cumErrs, hwOverrunErr) <> 0 then
             Announce('HostErr: output Hardware overrun.');
           if BitAnd(cumErrs, framingErr) <> 0 then
             Announce('HostErr: output Framing error.');
           err := SerReset(toHostRef, configNum);
         end;
 end;

 function GetBytes (p: Ptr; request: longInt): integer;
   var
     t, count: longInt;
     err: integer;
     oldp: Ptr;
 begin
   t := Ticks^;
   repeat
     err := SerGetBuf(frmHostRef, count);
   until (count >= request) or (Ticks^ > t + 60) or (err <> noErr);
   if count < request then
     begin
       err := -3333;
       AnnounceB('GetBytes: timeout.');
     end
   else if err <> noErr then
     AnnounceB(stringof('GetBytes: read error #', err : 1))
   else
     begin  { got some chars. }
       count := request;
       oldp := p;
       err := FSRead(frmHostRef, count, p);
       if err = noErr then
         begin
           if byteptr + count > bugBuffSize then
             byteptr := 0;
           blockmove(p, Ptr(ord4(@inbytes) + byteptr), count);
           byteptr := byteptr + count;
         end;
     end;
   GetBytes := err;
 end;

 procedure Request_Record;
   { Request a record by sending an 'R' or a 'D' to the other BE. }
   var
```

```
    err: integer;
begin
  GetState := GotDone;
  GetRTime := TickCount;
  if Delta then
    err := WriteStrOut('D')
  else
    err := WriteStrOut('R');          { and write out a request for the next record. }
end;

procedure SetHandShake;
  { Set handshaking.  If HardHandShake is true then set accordingly. }
  { else set Xon/Xoff on the output port and Xon/Xoff on the input port if acting is true. }
  var
    handshake: SerShk;
    err: integer;
begin
  with handshake do
    begin
      if HardHandShake then
        begin
          xOn := char(0);
          xOff := char(0);
        end
      else
        begin
          xOn := char(ord('S') - 64);
          xOff := char(ord('Q') - 64);
        end;
      fCTS := ord(HardHandShake);
      fXOn := ord(not HardHandShake);
      fInX := ord(not HardHandShake);
      errs := parityErr + hwOverrunErr + framingErr;
      evts := 0;
      err := SerHShake(toHostRef, handshake);
      err := SerHShake(frmHostRef, handshake);
    end;
end;

procedure SendHostRecord (doDelta: Boolean);
  { Send a record to the host.  If doDelta is true send 'D:' <delta changes> <$00> }
  { else send 'R:' <changes> <$00FF>. }
  type
    longPtr = ^longInt;
  var
    outPtr, fullOutPtr: ptrsType;
    startPtr: Ptr;
    sendIdx, j, k, err, sentbytes: integer;
    stp: SixPtrType;
    temp: packed array[0..40] of SignedByte;
    diff, diff2: integer;
    l: longInt;
    str: string;
```

```
    sendIt: Boolean;
    ip: IntPtr;
begin
  if not HostOn then
    exit(SendHostRecord);
  sentbytes := 0;
  startPtr := StripAddress(@sendOutBuff);
  { First write out 'R:' or 'D:' depending on doDelta. }
  outPtr.bp := startPtr;
  fullOutPtr.l := outPtr.l + sendOutLen - 20;
  if doDelta then
    outPtr.ip^ := Integer('D:')
  else
    outPtr.ip^ := Integer('R:');
  outPtr.l := outPtr.l + 2;
  if verbose then
    announce(stringof('SendHostRecord: ', tohostPBPtr^.ioReqCount : 1, ' bytes,  RecNodeNum = ',
      RecNodeNum : 1));
  for k := 1 to RecNodeNum do
    with RecTreePtr^[k] do
      begin
        str := mainTreePtr^.Storage[idx]^.name;
        stp := SixPtrType(@mainTreePtr^.Storage[idx]^.lSix.pt);
        sendIdx := 2;
        temp[0] := 0;
        temp[1] := 0;
        for j := 0 to 5 do
          begin
            sendit := false;
            if SendChanges then
              begin                    { If sending all changes then if this has changed }
                if stp^.s[j] <> lastSix.s[j] then
                  begin     { since what's in the recorded tree then send it. }
                    sendit := true;
                  end;
              end
            else if flagType(ord(out0) + j) in mainTreePtr^.Storage[idx]^.flags then  { else if the serial
        bit is }
              sendit := true;                                                      { set then send
        it. }
            if sendit then
              if doDelta then
                begin
                  diff2 := stp^.s[j] - lastSix.s[j];
                  diff := MinMaxOf(-128, diff2, 127);
                  if (j >= 3) and (diff <> diff2) then
                    begin
                      if diff = 127 then
                        diff2 := stp^.s[j] - (lastSix.s[j] + 3600)
                      else
                        diff2 := (stp^.s[j] + 3600) - lastSix.s[j];
                      if abs(diff2) < abs(stp^.s[j] - lastSix.s[j]) then
                        diff := MinMaxOf(-128, diff2, 127);
```

```
            lastSix.s[j] := DegRange(lastSix.s[j] + diff);
          end
        else
          lastSix.s[j] := lastSix.s[j] + diff;
        temp[sendIdx] := diff;
        sendIdx := sendIdx + 1;
        BitSet(@temp[0], j);
        if verbose then
          str := stringof(str, ' j=', j : 1, ' diff= ', diff : 1, ' value= ', stp^.s[j] : 1);
      end
    else
      begin
        ip := IntPtr(@temp[sendIdx]);
        ip^ := stp^.s[j];
        BitSet(@temp[0], j);
        if verbose then
          str := stringof(str, ' j=', j : 1, ' value= ', stp^.s[j] : 1);
        sendIdx := sendIdx + 2;
        lastSix.s[j] := stp^.s[j];
      end;
  end;
 if temp[0] <> 0 then
  begin { If any of the bits are set then send an entry for this node. }
    temp[1] := k;            { set index to RecordedTree }
    BlockMove(@temp, outPtr.bp, sendIdx);
    outPtr.l := outPtr.l + sendIdx;
    if verbose then
      announce(str);
  end;
 if outPtr.l > fullOutPtr.l then
  begin
     { The send out buffer is full, send what we have without async, then reset and fill again. }
    Announce('SendHostRecord: send out buffer full, emptying...');
    tohostPBPtr^.ioBuffer := startPtr;
    tohostPBPtr^.ioReqCount := outPtr.l - longint(startPtr);
    sentbytes := tohostPBPtr^.ioReqCount;
    err := PBWrite(tohostPBPtr, false); { write without async. }
    outPtr.bp := startPtr;
  end;
 end;    { for each node }
outPtr.bp^ := 0;
outPtr.l := outPtr.l + 1;
if not doDelta then
 begin
  outPtr.bp^ := SignedByte($FF);
  outPtr.l := outPtr.l + 1;
 end;
  { and send out all the bytes for this record. }
tohostPBPtr^.ioBuffer := startPtr;
tohostPBPtr^.ioReqCount := outPtr.l - longint(startPtr);
sentbytes := tohostPBPtr^.ioReqCount;
err := PBWrite(tohostPBPtr, true);   { write with async. }
if verbose then
```

```
    Announce(stringof('sentbytes = ', sentbytes : 1));
  end;    { SendHostRecord }

{$ifc EmulateHost }
{ getHostRecord get's called if we are emulating an SGI for PDI while listening to }
{ a BFR. by CLB, VPL. }
  procedure getHostRecord (doDelta, request: Boolean);
    { Try to get a record of the form sent by SendHostRecord from the host.  If doDelta is true we have sent
        out }
    { a 'D' and are expecting a delta record back.  If request is true then send a 'R' or 'D' to request another
        record }
    { after this one is received. }

    var
      i, err, nodeNum,{}
      nodecount, index, value, bits: integer;
      delta: SignedByte;
      p: PRecPtr;
      t, jiffy, count: longInt;
      twochar: packed array[1..2] of char;
      finished: boolean;
      str: string;
      startbyteptr:  integer;
  begin
    startbyteptr := byteptr;
    err := GetBytes(@twochar, 2);
    if err <> noErr then
      AnnounceB(stringof('getHostRecord: read error #', err : 1))
    else if doDelta then
      begin
        if (twochar <> 'D:') then
          begin
            AnnounceB('Got some chars back from "D", but not "D:".');
            err := -3333;
          end;
      end
    else if twochar <> 'R:' then
      begin
        AnnounceB('Got some chars back from "R", but not "R:".');
        err := -3333;
      end;
    if err = noErr then
      begin
        finished := false;
        repeat
            { high byte has bits for which sixAxis have changed. }
          bits := 0;
          err := GetBytes(@bits, 1);
          if (err <> noErr) or (bits = 0) then
            begin
              if verbose and (err <> noErr) then
                Announce('getHostRecord: Error getting high byte.');
              finished := true;
```

```
          end
        else
          begin
          { low byte is an index into recordedTree which has an index into Storage }
            err := GetBytes(StripAddress(Ptr(ord4(@bits) + 1)), 1);
            index := RecTreePtr^[BAND(bits, $FF)].idx;
            p := IdxtoPtr(mainTreePtr, PRecPtr(index));
            if p = nil then
              Announce(StringOf('getHostRecord: NIL reference for Point index # ', BAND(bits, $FF) : 1,
'.'))
            else
              p^.dirty := true;
            if verbose then
              str := stringof(NumtoHex(bits, 4), ' ', p^.name);
            for i := 0 to 5 do
              if BitTst(@bits, i) then
                begin
                  if doDelta then
                    begin
                      err := GetBytes(@delta, 1);
                      value := p^.ISix.s[i] + delta;
                      if verbose then
                        str := stringof(str, ' ', i : 1, ' delta=', delta : 1, ' value=', value : 1);
                    end
                  else
                    begin
                      err := GetBytes(@value, 2);
                      if verbose then
                        str := stringof(str, '`i=', i : 1, ' value=', value : 1);
                    end;
                  if p <> nil then
                    SetSixth(p, i, value);
                end;
            if verbose then
              announce(str);
          end;      { while not proccessing changed nodes. }
      until finished;
      if (err = noErr) and not doDelta then    { Get the last byte for the integer end. }
        i := GetBytes(@i, 1);
    end;        { if not done playing }
  OutCountPtr^ := OutCountPtr^ + 1;    { Increment the output counter }
  if request then
    Request_Record;
  if verbose then
    announce(stringof('getHostRecord: read ', byteptr - startbyteptr : 1, ' chars.'));
end;          { getHostRecord }

procedure get_Partial;
{ get_Partial gets bytes from another BodyElectric the same as getHostRecord(doDelta=false).  Its the same
      algorithm except }
{ it is written to be reentrant and if all the characters aren't there it will exit and try again the next time it
      is called. }
{ It uses the Getxxx global variables to retain it's state. }
```

```
{ At the moment this can only handle full records, not delta changes. }
   var
     err, index, value: integer;
     t, count: longInt;
     twochar: packed array[1..2] of char;
     str: string;
     startbyteptr: integer;
     charsWaiting: longInt;
  begin
    err := SerGetBuf(frmHostRef, charsWaiting);
    if charsWaiting < 2 then
      begin
        if GetRTime + 60 < TickCount then
          AnnounceB('get_Partial: "R" timeout, try again.');
        exit(get_Partial);
      end;
    if GetState = GotDone then
      begin
        startbyteptr := byteptr;
        err := GetBytes(@twochar, 2);
        if err <> noErr then
          AnnounceB(stringof('get_Partial: read error #', err : 1))
        else if twochar <> 'R:' then
          AnnounceB('Got some chars back from "R", but not "R:".')
        else
          GetState := GetHigh;
      end;
    while (GetState <> GotDone) do
      begin
        err := SerGetBuf(frmHostRef, charsWaiting);
        if charsWaiting < 2 then
          exit(get_Partial);
        { high byte has bits for which sixAxis have changed. }
        if GetState = GetHigh then
          begin
            err := GetBytes(@GotHigh, 2);
            if (err <> noErr) or (GotHigh = $00FF) then
              begin
                if verbose then
                  announce(stringof('get_Partial: read ', byteptr - startbyteptr : 1, ' chars.'));
                OutCountPtr^ := OutCountPtr^ + 1;      { Increment the output counter }
                Request_Record;
                exit(get_Partial);
              end
            else
              begin
                GetState := Getting;
                index := RecTreePtr^[BitAnd(GotHigh, $FF)].idx;
                GetP := IdxtoPtr(mainTreePtr, PRecPtr(index));
                GetP^.dirty := true;
                if verbose then
                  str := stringof(NumtoHex(GotHigh, 4), ' ', GetP^.name);
                GetIndex := 0;          { Start out with 0 of 0..5 }
```

```
        end;
      end;
        { low byte is an index into recordedTree which has an index into Storage }
      if BitTst(@GotHigh, GetIndex) then
        begin
          err := SerGetBuf(frmHostRef, charsWaiting);
          if charsWaiting < 2 then
            exit(get_Partial);
          err := GetBytes(@value, 2);
          SetSixth(GetP, GetIndex, value);
          if verbose then
            str := stringof(str, ', ', GetIndex : 1, ' value=', value : 1);
        end;
      GetIndex := GetIndex + 1;
      if GetIndex > 5 then
        begin
          GetState := GetHigh;
          if verbose then
            announce(str);
        end;
    end;    { while GetState <> GotDone }
  end;      { get_Partial }
{$endc }

{ This get's called once through the main loop.  Do things if the host requests. }
  procedure CheckHost;
    {  Check and see if the host has sent a request.  If it has, then}
    {  reply with the correct buffer. }
    const
      MaxInBuff = 64;
    var
      err, i: integer;
      count: LongInt;
      inBuff: packed array[1..MaxInBuff] of char;
      ch: char;
      str: string;

  begin      { CheckHost }
    if HostOn then
      if acting then
        begin
{$ifc EmulateHost }
            { we are currently acting like a host.  Try to get another record. }
          if Delta then
            getHostRecord(true, true)
          else
            get_Partial;
{$endc }
        end
      else
        begin
          err := SerGetBuf(frmHostRef, count);
          if (err = 0) then
```

```
    if (count <> 0) then
      begin { got some chars. }
        count := 1;
        err := FSRead(frmHostRef, count, @inBuff);
        ch := inBuff[1];
        if makeString then
          begin           { Get the name of a script to execute.  grab chars until CR. }
            if ch in strEndChars then
              begin
                Announce(stringof('CheckHost:   executing S.cript ''', cmdstr, '''.'));
                if ExScriptName(cmdstr) then
                  str := 'S:OK'
                else
                  str := 'S:ERR';
                err := WriteStrOut(str);
                makeString := false;
              end
            else if ch in validChars then
              cmdstr := concat(cmdstr, ch);
          end
        else
          case ch of
            'R':
              begin
                SendHostRecord(false);
              end;
            'D':
              begin
                SendHostRecord(true);
              end;
            'T':
              begin
                Announce('CheckHost:  sending T.ree.');
                MakeRecordTree(true, false);      { add unnamed, don't set last to -3333. }
                err := WriteStrOut('T:');
                SaveMassaged(toHostRef);
              end;
            'S':
              begin       { Start grabbing chars for the script to execute. }
                cmdstr := '';
                makeString := true;
              end;
            otherwise { do nothing }
              if verbose then
                Announce(StringOf('CheckHost: unknown char ', ch, ', $', NumtoHex(ord(ch), 2)));
          end; { case }
      end;          { If have chars from Host. }
    CheckStatus;
  end;              { If HostOn }
end;              { CheckHost }

{$ifc EmulateHost }
{ Act like an SGI and get the tree from the other mac. }
```

```
procedure menuGetTree (dyItem: integer);
  var
    err: integer;
    str: string;
    inbuff: packed array[0..100] of char;
    twochar: packed array[1..2] of char;
begin
  str := 'T';
  err := WriteStrOut('T');
  err := GetBytes(@twochar, 2);
  if err <> noErr then
    AnnounceB(stringof('menuGetTree: read error #', err : 1))
  else if twochar = 'T:' then
    LoadMassaged(frmHostRef)
  else
    AnnounceB('Got some chars back from "T", but not "T:".');
end;

procedure FlushInput (dyItem: integer);
  var
    buff: packed array[1..50] of Byte;
    i, err: integer;
    t: longint;
    str: string;
    show: boolean;
begin   { flush out the input port. }
  if verbose then
    Announce('FlushInput');
  str := 'FlushInput: ';
  show := false;
  repeat
    err := GetBytes(@buff, 1);
    if err = noErr then
      begin
        show := true;
        str := stringof(str, ' ', NumtoHex(buff[1], 2));
        if length(str) > 40 then
          begin
            Announce(str);
            str := ' more: ';
            show := false;
          end;
      end;
  until (err <> noErr) or (Ticks^ > t + 60);
  if show then
    Announce(str);
end;

procedure menuVerbose (dyItem: integer);
  { Toggle the verbose flag on/off.  Just for debugging. }
begin
  verbose := not verbose;
  CheckItem(HostMenu, dyItemtoItem(HostMenu, dyItem), verbose);
```

```
end;

procedure menuDelta (dyItem: integer);
  { Toggle requesting delta records on/off. }
begin
  Delta := not Delta;
  CheckItem(HostMenu, dyItemtoItem(HostMenu, dyItem), Delta);
end;

procedure menuGetRec (dyItem: integer);
  { Request and get one record from the other BE. }
  var
    err: integer;
begin
  Request_Record;
  gethostrecord(Delta, false);
  FlushInput(0);
end;

procedure ActLikeHost (dyItem: integer);
  { Set acting true to go into continuous host mode. Get records and render them. }
  var
    err: integer;
begin
  acting := not acting;
  if acting then
    begin
      if verbose then
        Announce(StringOf('@inbytes = $', @inbytes, ', @byteptr = $', @byteptr));
      menuGetTree(0);
      Request_Record;    { Prime the pipe by requesting the first record. }
    end
  else
    begin
      FlushInput(0);
    end;
  CheckItem(HostMenu, dyItemtoItem(HostMenu, dyItem), acting);
end;
{$endc }

procedure OpenHost;
  {  Open the host for I/O using the global configuration parameters. }
  var
    i, err: integer;
    str: string;
    portname: Str255;
    portCh: char;
    handshake: SerShk;
    BaudTable: array[0..9] of Integer;
    ParTable: array[0..2] of Integer;
    StopTable: array[0..2] of Integer;

  procedure SetupTables;
```

```
    begin { Set up the serial I/O tables. }
      BaudTable[0] := baud300;
      BaudTable[1] := baud600;
      BaudTable[2] := baud1200;
      BaudTable[3] := baud1800;
      BaudTable[4] := baud2400;
      BaudTable[5] := baud3600;
      BaudTable[6] := baud4800;
      BaudTable[7] := baud7200;
      BaudTable[8] := baud9600;
      BaudTable[9] := baud19200;
      ParTable[0] := evenParity;
      ParTable[1] := oddParity;
      ParTable[2] := noParity;
      StopTable[0] := Stop10;
      StopTable[1] := Stop15;
      StopTable[2] := Stop20;
    end;
  begin
    HostOn := false;

    if hostBit in DAconfig.bits then
      begin
        SetupTables;
        StrEndChars := [chr(13)];
        validChars := [chr(32)..chr(255)];
        makeString := false;
        acting := false;
        byteptr := 0;
        verbose := false;
        Delta := false;
        SendChanges := (DAconfig.HostConfig.Change = 1);        { Btn 0 = false, 1 = true. }
        HostMenu := DAMHndl;
        portCh := chr(ord('A') + portNum - 1);
        toHostFname := concat('.', portCh, 'Out');
        frmHostFname := concat('.', portCh, 'In');
        portName := UserPortName(portNum);
        err := FSOpen(toHostFname, 0, toHostRef);
        if err = 0 then
          err := FSOpen(frmHostFname, 0, frmHostRef);
        if err = 0 then
          begin
            with DAconfig.HostConfig do
              configNum := BaudTable[BaudRate] + ParTable[Parity] + StopTable[Stops] + data8;
            err := SerReset(toHostRef, configNum);
            err := SerReset(frmHostRef, configNum);
{$ifc BigSerBuff }
            err := SerSetBuf(toHostRef, @serOutBuff, serBuffLen);
            err := SerSetBuf(frmHostRef, @serInBuff, serBuffLen);
{$endc }
            SetHandShake;
            HostOn := true;
            tohostPBPtr := @tohostPB;
```

```
         with tohostPBPtr^ do
           begin
             ioCompletion := nil;
             ioRefNum := toHostRef;
             ioBuffer := @hostbuff;
           end;
       end;
     If err <> 0 then
       begin
         HostOn := false;
         str := StringOf('Host port open failed on the ', portname, '.  Error: ', err : 1, '.');
         Announce(str);
       end
     else
       begin
         Announce(StringOf('Host communications opened on the ', portname, '.'));
{$ifc EmulateHost }
         startDy := dyNewItem(HostMenu, '(-', @menuGetTree, false);
         i := dyNewItem(HostMenu, 'Host get Tree', @menuGetTree, false);
         i := dyNewItem(HostMenu, 'Host get Record', @menuGetRec, false);
         i := dyNewItem(HostMenu, 'Act like Host', @ActLikeHost, false);
         i := dyNewItem(HostMenu, 'Flush Host Input', @FlushInput, false);
         i := dyNewItem(HostMenu, 'Get Delta change', @menuDelta, false);
         stopDy := dyNewItem(HostMenu, 'Host Verbose', @menuVerbose, false);
{$endc }
       end;
   end;
 end; { OpenHost }

 procedure CloseHost;
   { Close the host for I/O. }
   var
     i, err: integer;
     b: Boolean;
 begin
   If HostOn then
     begin
       HostOn := false;
       err := SerSetBuf(toHostRef, nil, 0);
       err := SerSetBuf(frmHostRef, nil, 0);
       err := FSClose(toHostRef);
       err := FSClose(frmHostRef);
{$ifc EmulateHost }
       for i := startDy to stopDy do
         begin
           b := dyDelItem(HostMenu, i);
         end;
{$endc }
     end;
 end; { CloseHost }

{$endc }
```

```
end.
```

```
{ DataGlove Macintosh Initialization and startup.  This is in a separate file because}
{ this stuff can't be run in debug mode.  Since it is here the other initialization }
{ stuff can be debugged. }

{   Copyright 1987 VPL Research Inc. }
{   Chuck Blanchard 6/23/87 }

unit InitMacUnit;
interface
  uses
    ChuckStuff, Globals;

  procedure InitMac;

implementation

  procedure InitMac;
    const
      StackSize = 40 * $00000400;      { 40k, but make sure it's a long. }
    var
      i: integer;
      HeapTop: LongInt;
  begin
    if true then
      begin
    {init everything so I can test for 68881 in sysEnvirons. }
        InitGraf(@thePort);           {create a grafport for the screen}
        InitFonts;                    {startup the fonts manager}
        InitWindows;                  {startup the window manager}
        InitMenus;                    {startup the menu manager}
        TEInit;                       {startup the text edit manager}
        InitDialogs(nil);             {startup the dialog manager}

        HeapTop := LongInt(StripAddress(@i)) - StackSize;
        SetApplLimit(Ptr(HeapTop));
        MaxApplZone;

        for i := 1 to 20 do           {extra pointer blocks at the bottom of the heap}
          MoreMasters;                {this is i X 64 master pointers}
      end
    else
      begin
        for i := 1 to 10 do           {extra pointer blocks at the bottom of the heap}
          MoreMasters;                {this is i X 64 master pointers}
      end;
    {get the cursors we use and lock them down - no clutter}
    ClockCurs := GetCursor(watchCursor);
    HLock(Handle(ClockCurs));
    HandCurs := GetCursor(handCursID);
    HLock(Handle(HandCurs));

    {show the watch while we wait for inits & setups to finish}
```

```
    SetCursor(ClockCurs^^);

  end;
end.
```

```
{ last version 4.10.89}
{ by Scott Burgess}


unit initMIDI;

interface

  uses
    ChuckStuff, Globals, AutoLib, MiscRoutines, serialTypes, serialRoutines, MIDI;

  type
    midiPo = (modem, printer);
  var
    midiPort: midiPo;

  procedure initMIDI;
  procedure resetMIDI;
  procedure playNote (channel, noteNum, velocity: integer);
  procedure controller (channel, controlNum, value: integer);
  procedure pitchBend (channel, num1, num2: integer);

  var
    midiState: Boolean;
    outPortRef, timePortRef: integer;

implementation

  const
    belconNo = 128;
    oneKbuff = 1024;
    noFlags = 0;
    pitchBendMsg = $E0;
    noteOn = $90;
    control = $B0;
    msgLength = 9;  {bytes (6 for packet,  + 3 for message)}

  var
    belcon: Handle;
    refCon: longint;
    MIDIparams: MIDIPortParams;
    currPacket: MIDIPacket;
    midiErr: OSErr;

  procedure initMidi;
    var
      midiVersion: longint;
      beName: str255;
  begin
{sign in to MIDI manager}

    midiVersion := SndDispVersion(midiToolNum);
    if (midiVersion = 0) then
```

-000457

```
    begin
      announce('Turning MIDI off ... couldn''t open the MIDI Manager');
      midiState := false;
    end
  else
    begin
      beIcon := GetResource('ICN#', beIconNo);
      HLock(beIcon);
      beName := 'Body Electric 2.0+';
      midiErr := MIDISignIn(AppType, refCon, beIcon, beName);
      midiState := true;
      announce('MIDI Signed in');
      announce('Connecting Body Electric to MIDI Driver on Printer port');
      midiErr := MIDIConnectData(Apptype, 'mOut', 'amdr', 'Bout');
      disablePort(portB);

{set up ports for MIDI manager}


      with MIDIparams do
        begin
          portID := 'time';
          portType := midiPortTypeTime;
          timebase := 0;            {no time base}
          offsetTime := 0;      {no offset time}
          readHook := nil;      {no reading in}
          refCon := 2;          {our 2nd port - no real import}
          with initClock do
            begin
              sync := midiInternalSync;
              curTime := 0;
              format := midiFormatMsec; {milliseconds}
            end;
          name := 'Clock';
        end;
      midiErr := MIDIAddPort(appType, oneKBuff, timePortRef, @MIDIparams);

      with MIDIparams do
        begin
          portID := 'mOut';
          portType := midiPortTypeOutput;
          timebase := timePortRef;          {our clock time base}
          offsetTime := 0;      {no offset time}
          readHook := nil;      {no reading in}
          refCon := 1;          {our 1st port - no real import}
          with initClock do
            begin
              sync := midiInternalSync;
              curTime := 0;
              format := midiFormatMsec; {milliseconds}
            end;
          name := 'Sound Out';
        end;
```

```
      midiErr := MIDIAddPort(appType, oneKBuff, outPortRef, @MIDIparams);

      MIDIstartTime(timePortRef);
    end;
  end;


procedure playNote (channel, noteNum, velocity: integer);
  var
    error: OSErr;
begin
  with currPacket do
    begin
      flags := noFlags;
      len := msgLength;
      tStamp := MIDIGetCurTime(timePortRef);
      data[0] := byte(noteOn + (channel - 1));
      data[1] := byte(noteNum);
      data[2] := byte(velocity);
    end;
  error := MIDIwritePacket(outPortRef, @currPacket);
end;


procedure controller (channel, controlNum, value: integer);
begin
  with currPacket do
    begin
      flags := noFlags;
      len := msgLength;
      tStamp := MIDIGetCurTime(timePortRef);
      data[0] := byte(control + (channel - 1));
      data[1] := byte(controlNum);
      data[2] := byte(value);
    end;
  midiErr := MIDIwritePacket(outPortRef, @currPacket);
end;

procedure pitchBend (channel, num1, num2: integer);
begin
  with currPacket do
    begin
      flags := noFlags;
      len := msgLength;
      tStamp := MIDIGetCurTime(timePortRef);
      data[0] := byte(pitchBendMsg + (channel - 1));
      data[1] := byte(num1); {NB: the order of sending num1 and num2 may be wrong}
      data[2] := byte(num2);
    end;
  midiErr := MIDIwritePacket(outPortRef, @currPacket);
end;
```

```
procedure resetMidi;
  var
    x, y: integer;
begin
  if midiState then
    begin  {only if midi is on}
      for y := 1 to 16 do {do all channels}
        for x := 0 to 127 do {turn off all notes }
          playNote(y, x, 0);
      MIDISignOut(appType);  {say goodbye to MIDI manager}
      HUnlock(beIcon);         {unlock the icon}
      ReleaseResource(beIcon);  {get rid of icon}
      midiState := false;
    end;
end;

end.
```

```
{ Handle communications to the CPSA DataFlash IO proccesor. }

{ by CPSA 9/1/87 }
{ modified by Chuck Blanchard, VPL Research, Inc.  9/6/87 }

unit Iop_calls;
interface
  uses
    SCSI;

  function Write_io_port (port, value: BYTE): INTEGER;

  function Read_io_port (port: BYTE; var value: BYTE): INTEGER;

  function Write_iop_memory (iop_start_address: INTEGER; data_rec_ptr: ptr; data_count: INTEGER):
       INTEGER;

  function Read_iop_memory (iop_start_address: INTEGER; data_rec_ptr: ptr; data_count: INTEGER):
       INTEGER;

  function Branch (branch_address: INTEGER): INTEGER;

  function Write_block (data_rec_ptr: ptr; total_bytes: INTEGER; block_address: INTEGER;
       number_blocks: Byte): INTEGER;

  function Read_block (data_rec_ptr: ptr; total_bytes: INTEGER; block_address: INTEGER; number_blocks:
       Byte): INTEGER;

  function Hex_download (hex_file_ptr: ptr; total_bytes: INTEGER): INTEGER;


implementation
  const
{This is the scsi port assigned to DataFlash }
    iop_scsi_port = 1;
    waitCount = 10;

    { Opcodes to send to the IOP for the different commands. }
    ReadMemOp = $09;
    WriteMemOp = $0B;
    BranchOp = $0C;
    ReadPortOp = $C0;
    WritePortOp = $C1;
    ReadBlockOp = $08;
    WriteBlockOp = $0A;
    HexDownOp = $C3;

  type
    two_byte = packed array[1..2] of BYTE;
    inst_3byte = packed array[1..3] of BYTE;
    inst_6byte = packed array[1..6] of BYTE;
```

```
{This instruction is for scNoInc and scStop}
   instruction1 = record
      scsi_opcode1: INTEGER;
      scsi_param1: ptr;
      scsi_param2: LONGINT;{number of real data bytes}
      scsi_opcode2: INTEGER;
    end;

  function Write_io_port; { port , value: BYTE) : INTEGER; }
{ Write the given value out to the given output port. }
   type

{ The port address is the second byte of this array }
     write_io_port_inst = inst_3byte;

   var
     stat, com_stat, message: INTEGER;
     buffer: write_io_port_inst;
     tib_commands: instruction1;
     tempBuff: two_Byte;

  begin
   buffer[1] := WritePortOp;
   buffer[2] := port;
   buffer[3] := $00;
   tempBuff[1] := value;

   tib_commands.scsi_opcode1 := scNoInc;
   tib_commands.scsi_param1 := @tempBuff;
   tib_commands.scsi_param2 := 1;
   tib_commands.scsi_opcode2 := scStop;

   stat := SCSIGet;
   if stat = noErr then
     stat := SCSISelect(iop_scsi_port);

 { Put the scsi iop write buffer here and the number of  bytes to write out.}
   if stat = noErr then
     stat := SCSICmd(@buffer, 3);

   if stat = noErr then
     stat := SCSIWrite(@tib_commands);

   if stat = noErr then
     stat := SCSIComplete(com_stat, message, waitCount);
 {com_stat and message are not checked but converted internally to a stat }
   Write_io_port := stat;
  end;

  function Read_io_port; { (port BYTE; var value: BYTE): INTEGER; }
 { Read the given input port and return in value the byte returned. }
```

```
  type

{ The port address is the second byte of this array }
     read_io_port_inst = inst_3byte;

  var
     stat, com_stat, message: INTEGER;
     buffer: read_io_port_inst;
     tib_commands: instruction1;
     tempBuff: two_byte;

 begin
   buffer[1] := ReadPortOp;
   buffer[2] := port;
   buffer[3] := $00;

   tib_commands.scsi_opcode1 := scNoInc;
   tib_commands.scsi_param1 := @tempBuff;
   tib_commands.scsi_param2 := 1;
   tib_commands.scsi_opcode2 := scStop;

   stat := SCSIGet;
   if stat = noErr then
     stat := SCSISelect(iop_scsi_port);

{ Put the scsi iop write buffer here and the number of  bytes to write out.}
   if stat = noErr then
     stat := SCSICmd(@buffer, 3);

   if stat = noErr then
     stat := SCSIRead(@tib_commands);

   if stat = noErr then
     stat := SCSIComplete(com_stat, message, waitCount);
{com_stat and message are not checked but converted internally to a stat }
   Read_io_port := stat;
   value := tempBuff[1];
 end;

 function Write_iop_memory; { iop_start_address : INTEGER; data_rec_ptr : ptr}
                            { data_count : INTEGER): INTEGER}


  type

{ The port address is the second byte of this array }
     write_iop_mem_rec = inst_6byte;

  var
     stat, com_stat, message: INTEGER;
     buffer: write_iop_mem_rec;
     tib_commands: instruction1;
     addrptr, countptr: ^two_byte;
```

```
 begin

   countptr := @data_count;
   addrptr := @iop_start_address;
   buffer[1] := WriteMemOp;
   buffer[2] := addrptr^[1];
   buffer[3] := addrptr^[2];
   buffer[4] := countptr^[1];
   buffer[5] := countptr^[2];
   buffer[6] := $00;

   tib_commands.scsi_opcode1 := scNoInc;
   tib_commands.scsi_param1 := data_rec_ptr;
   tib_commands.scsi_param2 := data_count;
   tib_commands.scsi_opcode2 := scStop;

   stat := SCSIGet;
   if stat = noErr then
     stat := SCSISelect(iop_scsi_port);

{ Put the scsi iop write buffer here and the number of  bytes to write out.}
   if stat = noErr then
     stat := SCSICmd(@buffer, 6);

   if stat = noErr then
     stat := SCSIWrite(@tib_commands);

   if stat = noErr then
     stat := SCSIComplete(com_stat, message, waitCount);
{com_stat and message are not checked but converted internally to a stat }
   Write_iop_memory := stat;
  end;

  function Read_iop_memory; { (iop_start_address : INTEGER; }
                            { data_rec_ptr : ptr; data_count : INTEGER):integer }

   type

{ The port address is the second byte of this array }
     read_iop_mem_rec = inst_6byte;

   var
     stat, com_stat, message: INTEGER;
     buffer: read_iop_mem_rec;
     tib_commands: instruction1;

     addrptr, countptr: ^two_byte;
  begin

    countptr := @data_count;
    addrptr := @iop_start_address;
    buffer[1] := ReadMemOp;
    buffer[2] := addrptr^[1];
```

-000464

```
    buffer[3] := addrptr^[2];
    buffer[4] := countptr^[1];
    buffer[5] := countptr^[2];
    buffer[6] := $00;

    tib_commands.scsi_opcode1 := scNoInc;
    tib_commands.scsi_param1 := data_rec_ptr;
    tib_commands.scsi_param2 := data_count;
    tib_commands.scsi_opcode2 := scStop;

    stat := SCSIGet;
    if stat = noErr then
      stat := SCSISelect(iop_scsi_port);

{ Put the scsi iop write buffer here and the number of  bytes to write out.}
    if stat = noErr then
      stat := SCSICmd(@buffer, 6);

    if stat = noErr then
      stat := SCSIRead(@tib_commands);

    if stat = noErr then
      stat := SCSIComplete(com_stat, message, waitCount);
{com_stat and message are not checked but converted internally to a stat }
    Read_iop_memory := stat;
  end;

  function Branch;
{ branch_address: INTEGER; }
{ returns INTEGER}

    type

{ The iop branch address is assigned to the 4 and 5 bytes in this array.}
      branch_rec = inst_6byte;

    var
      stat, com_stat, message: INTEGER;
      buffer: branch_rec;

      branchptr: ^two_byte;
  begin

    branchptr := @branch_address;
    buffer[1] := BranchOp;
    buffer[2] := $00;
    buffer[3] := $00;
    buffer[4] := branchptr^[1];
    buffer[5] := branchptr^[2];
    buffer[6] := $00;

    stat := SCSIGet;
    if stat = noErr then
```

-000465

```
      stat := SCSISelect(iop_scsi_port);

{ Put the scsi iop write buffer here and the number of  bytes to write out.}
    if stat = noErr then
      stat := SCSICmd(@buffer, 6);

    if stat = noErr then
      stat := SCSIComplete(com_stat, message, waitCount);
{com_stat and message are not checked but converted internally to a stat }
    Branch := stat;
  end;

  function Write_block;
{data_rec_ptr : ptr}
{total_bytes : INTEGER}
{block_address : INTEGER}
{number_blocks : BYTE}
{returns : INTEGER}

    type

{ The port address is the second byte of this array }
      write_block_rec = inst_6byte;

    var
      stat, com_stat, message: INTEGER;
      buffer: write_block_rec;
      tib_commands: instruction1;

      addrptr: ^two_byte;
  begin

    addrptr := @block_address;
    buffer[1] := WriteBlockOp;
    buffer[2] := $00;
    buffer[3] := addrptr^[1];
    buffer[4] := addrptr^[2];
    buffer[5] := number_blocks;
    buffer[6] := $00;

    tib_commands.scsi_opcode1 := scNoInc;
    tib_commands.scsi_param1 := Pointer(data_rec_ptr);
    tib_commands.scsi_param2 := total_bytes;
    tib_commands.scsi_opcode2 := scStop;

    stat := SCSIGet;
    if stat = noErr then
      stat := SCSISelect(iop_scsi_port);

{ Put the scsi iop write buffer here and the number of  bytes to write out.}
    if stat = noErr then
      stat := SCSICmd(@buffer, 6);
```

```
    if stat = noErr then
      stat := SCSIWrite(@tib_commands);

    if stat = noErr then
      stat := SCSIComplete(com_stat, message, waitCount);
{com_stat and message are not checked but converted internally to a stat }
    Write_block := stat;
  end;

  function Read_block;
{data_rec_ptr : ptr}
{total_bytes : INTEGER}
{block_address : INTEGER}
{number_blocks : BYTE}
{returns : INTEGER}

    type

{ The port address is the second byte of this array }
      read_block_rec = inst_6byte;

    var
      stat, com_stat, message: INTEGER;
      buffer: read_block_rec;
      tib_commands: instruction1;

      addrptr: ^two_byte;
  begin

    addrptr := @block_address;
    buffer[1] := ReadBlockOp;
    buffer[2] := $00;
    buffer[3] := addrptr^[1];
    buffer[4] := addrptr^[2];
    buffer[5] := number_blocks;
    buffer[6] := $00;

    tib_commands.scsi_opcode1 := scNoInc;
    tib_commands.scsi_param1 := Pointer(data_rec_ptr);
    tib_commands.scsi_param2 := total_bytes;
    tib_commands.scsi_opcode2 := scStop;

    stat := SCSIGet;
    if stat = noErr then
      stat := SCSISelect(iop_scsi_port);

{ Put the scsi iop write buffer here and the number of  bytes to write out.}
    if stat = noErr then
      stat := SCSICmd(@buffer, 6);

    if stat = noErr then
      stat := SCSIWrite(@tib_commands);
```

```
    if stat = noErr then
      stat := SCSIComplete(com_stat, message, waitCount);
{com_stat and message are not checked but converted internally to a stat }
    Read_block := stat;
  end;

  function Hex_download; { (hex_file_ptr : ptr; total_bytes :INTEGER): INTEGER; }
{ Download an Intel Hex format ASCII file of chars to the IOP. }
    type

      hex_download_inst = inst_3byte;

    var
      stat, com_stat, message: INTEGER;
      buffer: hex_download_inst;
      tib_commands: instruction1;

  begin
    buffer[1] := HexDownOp;
    buffer[2] := $00;
    buffer[3] := $00;

    tib_commands.scsi_opcode1 := scNoInc;
    tib_commands.scsi_param1 := Pointer(hex_file_ptr);
    tib_commands.scsi_param2 := total_bytes;
    tib_commands.scsi_opcode2 := scStop;

    stat := SCSIGet;
    if stat = noErr then
      stat := SCSISelect(iop_scsi_port);

{ Put the scsi iop write buffer here and the number of bytes to write out.}
    if stat = noErr then
      stat := SCSICmd(@buffer, 3);

    if stat = noErr then
      stat := SCSIWrite(@tib_commands);

    if stat = noErr then
      stat := SCSIComplete(com_stat, message, waitCount);
{com_stat and message are not checked but converted internally to a stat }
    Hex_download := stat;
  end;

end.
```

```
{ in this unit, Scott will attempt to add MacADIOS to the data acquisition line-up}
{ by Scott Burgess }
{ © 1989 VPL Research, Inc. }
{ latest version: Feb 27, 1989 }

unit macADIOSDAcq;

interface
  uses
    CompileTime, chuckstuff, AutoLib, Globals, FastStuff, MiscRoutines, RawUnit, MacADIosUtils;

  const
    adiosReadSize = 10;

  var
    bank: integer;

  function MacADIOSDA (v: DAverb; var dar: DARec): integer;

implementation

{ This is the MacADIOS Data Acquisition module. It reads the A/D's in the MacADIOS card}

  function MacADIOSDA; { (v : DAverb; var dar : DARec) : integer }

    const
      testSpeed = 1000000;

      glove1strID = 256;
      upprBodystrID = 257;
      lowrBodystrID = 258;
      glove2strID = 259;
      controlsstrID = 260;

    var
      i, err, theSlot: integer;
      str: string;
      t, ticksB, ticksA: longint;
      speed: longint;
      clockSpeed: extended;
      prefix: string[5];
      resString: str255;
      strHandle: handle;

  begin
    theSlot := DAConfig.adiosSlot;
    case v of
      initDA:
        begin

          init_adios(DAconfig.adiosSlot);

          if false then
```

```
          AnnounceB(StringOf('ADIOS working'));
        dar.Private := nil;
        dar.name := 'MacADIOS';
        case daconfig.adiosUse of
          oneGlove:
            dar.Size := 16;
          twoGloves:
            dar.Size := 32;
          controls:
            dar.Size := 10;
          datasuit:
{$ifc DataSwitch }
            dar.Size := 65 + 8;
{$elsec }
          dar.Size := 65;
{$endc }
        end;
        dar.FirstSlot := AllocateRaw(dar.name, dar.Size);


        if dar.FirstSlot <> -1 then
          begin
            dar.ptrto := @RawData[dar.FirstSlot];
            MacADIOSDA := 0;

            case daconfig.adiosUse of

              oneGlove:
                begin
                  strHandle := get1Resource('STR#', glove1strID);
                  if strHandle <> nil then
                    for i := 1 to 16 do
                      begin
                        getindString(resString, glove1strID, i);
                        rawDataDef[dar.FirstSlot + i - 1].name := resString;
                      end;
                end;

              twoGloves:
                begin
                  strHandle := get1Resource('STR#', glove1strID);
                  if strHandle <> nil then
                    for i := 1 to 16 do
                      begin
                        getindString(resString, glove1strID, i);
                        rawDataDef[dar.FirstSlot + i - 1].name := resString;
                      end;
                  strHandle := get1Resource('STR#', glove1strID);
                  if strHandle <> nil then
                    for i := 1 to 16 do
                      begin
                        getindString(resString, glove2strID, i);
                        rawDataDef[15 + dar.FirstSlot + i].name := resString;
```

```
          end;
        end;


        controls:
         begin
          strHandle := get1Resource('STR#', controlsstrID);
          if strHandle <> nil then
            for i := 1 to 10 do
              begin
                getindString(resString, controlsstrID, i);
                rawDataDef[dar.FirstSlot + i - 1].name := resString;
              end;
         end;


        datasuit:
         begin

{get the names for the datasuit inputs from the following str# resources:}
{glove1strID = 256;}
{upprBodystrID = 257;}
{lowrBodystrID = 258;}
{glove2strID = 259;}

{name the two gloves like any other gloves for DM compatibility}
              strHandle := get1Resource('STR#', glove1strID);
              if strHandle <> nil then
                for i := 1 to 16 do
                  begin
                    getindString(resString, glove1strID, i);
                    rawDataDef[dar.FirstSlot + i - 1].name := resString;
                  end;

              strHandle := get1Resource('STR#', glove2strID);
              if strHandle <> nil then
                for i := 1 to 16 do
                  begin
                    getindString(resString, glove2strID, i);
                    rawDataDef[47 + dar.FirstSlot + i].name := resString;
                  end;


{ names for upper part of body}
              strHandle := get1Resource('STR#', upprBodystrID);
              if strHandle <> nil then
                for i := 1 to 16 do
                  begin
                    getindString(resString, upprBodystrID, i);
                    rawDataDef[15 + dar.FirstSlot + i].name := resString;
                  end;

{names for lower part of body}
```

```
                strHandle := get1Resource('STR#', lowrBodystrID);
                if strHandle <> nil then
                  for i := 1 to 16 do
                    begin
                      getindString(resString, lowrBodystrID, i);
                      rawDataDef[31 + dar.FirstSlot + i].name := resString;
                    end;

                rawDataDef[64 + dar.FirstSlot].name := StringOf('Boom Swing');
{$ifc DataSwitch }
{ Names for macAdios switches }
                strHandle := get1Resource('STR#', controlsstrID);
                if strHandle <> nil then
                  for i := 1 to 8 do
                    begin
                      getindString(resString, controlsstrID, i);
                      rawDataDef[dar.FirstSlot + 65 + (i - 1)].name := resString;
                    end;
{$endc }
                MacADIOSDA := 0;

              end;
            end;
          end;


        bank := 0;
      end;

    ReadDA:
      begin
        with dar do
          case daconfig.adiosUse of
            oneGlove:
              begin
                announceB('One glove MacADIOS use currently not implemented');
                err := -1;
              end;
            twoGloves:
              begin
                announceB('Two glove MacADIOS use currently not implemented');
                err := -1;
              end;
            controls:
              err := read_adios_C(ptr(ptrto), true);
            datasuit:
              begin
                err := get_suit(intptr(ptrto));
{$ifc DataSwitch }
                if err = noErr then
                  err := read_adios_C(ptr(ord4(ptrto) + (dar.Size - 8) * 2), false);
{$endc }
```

```
            end;

          end;

        case err of
          -1:
            Announce(StringOf('MacADIOS not responding'));
          -2:
            Announce(StringOf('MacADIOS slot number does not exist'));
        end;
      end;

    closeDA:
      begin
        close_adios;
        dar.state := DAoff;
      end;
    end;
    MacADIOSDA := 0;
  end;    { Case }
end.{ MACAdiosDA }
```

```
unit MIDI;

{}
{  MIDI.p}
{ }
{  This file contains the pascal-language interface for the MIDI Manager.}
{ }
{  Author: John Worthington, Don Marsh, Mark Lentczner}
{  Copyright © 1988, Apple Computer, Inc.}
{  All Rights Reserved}
{}

Interface

{    uses}
{     MemTypes, QuickDraw, OSIntf;}

  const

    midiToolNum = 4;          {tool number of MIDI Manager for SndDispVersion call}

    midiMaxNameLen = 31;      {maximum number of characters in port and client names}


    {Time formats}

    midiFormatMSec = 0;          {milliseconds}
    midiFormatBeats = 1;         {beats}
    midiFormat24fpsBit = 2;          {24 frames/sec.}
    midiFormat25fpsBit = 3;          {25 frames/sec.}
    midiFormat30fpsDBit = 4;         {30 frames/sec. drop-frame}
    midiFormat30fpsBit = 5;          {30 frames/sec.}
    midiFormat24fpsQF = 6;       {24 frames/sec.longInt format}
    midiFormat25fpsQF = 7;       {25 frames/sec.longInt format}
    midiFormat30fpsDQF = 8;          {30 frames/sec. drop-frame longInt format}
    midiFormat30fpsQF = 9;       {30 frames/sec.longInt format}

    midiInternalSync = 0;        {internal sync}
    midiExternalSync = 1;        {external sync}


    {Port types}

    midiPortTypeTime = 0;        {time port}
    midiPortTypeInput = 1;       {input port}
    midiPortTypeOutput = 2;          {output port}
    midiPortTypeTimeInv = 3;         {invisible time port}


    {OffsetTimes}
```

```
midiGetEverything = $7FFFFFFF;  {get all packets, regardless of time stamps}
midiGetNothing = $80000000; {get no packets, regardless of time stamps}
midiGetCurrent = $00000000; {get current packets only}



{}
{ MIDI data and messages are passed in MIDIPacket records (see below).}
{ The first byte of every MIDIPacket contains a set of flags}
{ }
{ bits 0-1 00 = new MIDIPacket, not continued}
{          01 = begining of continued MIDIPacket}
{          10 = end of continued MIDIPacket}
{          11 = continuation}
{ bits 2-3   reserved}
{ }
{ bits 4-6000 = packet contains MIDI data}
{          001 = packet contains MIDI Manager message}
{ }
{ bit 7    0 = MIDIPacket has valid stamp}
{          1 = stamp with current clock}
{}

    midiContMask = $03;
    midiNoCont = $00;
    midiStartCont = $01;
    midiMidCont = $03;
    midiEndCont = $02;

    midiTypeMask = $70;
    midiMsgType = $00;
    midiMgrType = $10;

    midiTimeStampCurrent = $80;
    midiTimeStampValid = $00;
    midiTimeStampMask = $80;


    {MIDI Manager MIDIPacket command words (the first word in the }
{     data field for midiMgrType messages) }

    midiOverflowErr = $0001;
    midiSCCErr = $0002;
    midiPacketErr = $0003;
    midiMaxErr = $00FF;          {all command words less than this value}
                                   {  are error indicators}


    {valid results to be returned by readHooks}

    midiKeepPacket = 0;
    midiMorePacket = 1;
```

```
   midiNoMorePacket = 2;


{}
{  Errors:}
{}

   midiNoClientErr = -250;{no client with that ID found}
   midiNoPortErr = -251; {no port with that ID found}
   midiTooManyPortsErr = -252; {too many ports already installed in the system}
   midiTooManyConsErr = -253; {too many connections made}
   midiVConnectErr = -254;  {pending virtual connection created}
   midiVConnectMade = -255; {pending virtual connection resolved}
   midiVConnectRmvd = -256; {pending virtual connection removed}
   midiNoConErr = -257;  {no connection exists between specified ports}
   midiWriteErr = -258;  {MIDIWritePacket couldn't write to all connected ports}
   midiNameLenErr = -259;   {name supplied is longer than 31 characters}
   midiDupIDErr = -260;  {duplicate client ID}
   midiInvalidCmdErr = -261; {command not supported for port type}


{}
{  Driver calls:}
{}

   midiOpenDriver = 1;
   midiCloseDriver = 2;


 type

{}
{ MIDI data and other messages are read and written in packets:}
{}

   MIDIPacket = packed record
      flags: BYTE;
      len: BYTE;
      tStamp: LONGINT;
      data: packed array[0..248] of BYTE;
    end;
   MIDIPacketPtr = ^MIDIPacket;


{}
{  Clocks:}
{}

   MIDIClkInfo = record
      sync: INTEGER;       {synchronization internal/external}
      curTime: LONGINT;       {current value of port's clock}
```

```
     format: INTEGER;    {time code format}
   end;


{}
{  port information}
{}

   MIDIIDRec = record
      clientID: OSType;
      portID: OSType;
    end;

   MIDIPortInfo = record
      portType: INTEGER;       {type of port}
      timeBase: MIDIIDRec;     {MIDIIDRec for time base}
      numConnects: INTEGER;       {number of connections}
      cList: array[1..100] of MIDIIDRec
                                                  {the connections}
    end;

   MIDIPortInfoPtr = ^MIDIPortInfo;
   MIDIPortInfoHdl = ^MIDIPortInfoPtr;


   MIDIPortParams = record
      portID: OSType;      {ID of port, unique within client}
      portType: INTEGER;       {Type of port - input, output, time, etc.}
      timeBase: INTEGER;       {refnum of time base, 0 if none}
      offsetTime: LONGINT;        {offset for current time stamps}
      readHook: Ptr;           {routine to call when input data is valid}
      refCon: LONGINT;     {refcon for port (for client use)}
      initClock: MIDIClkInfo;  {initial info for a time base}
      name: Str255;        {name of the port}
    end;

   MIDIPortParamsPtr = ^MIDIPortParams;


{}
{ ID List}
{}
   MIDIIDList = record
      numIDs: INTEGER;
      list: array[1..100] of OSTYPE;
    end;
   MIDIIDListPtr = ^MIDIIDList;
   MIDIIDListHdl = ^MIDIIDListPtr;


{ Prototype Declarations for readHooks and timeProcs }
```

```
{}
{FUNCTION myReadHook(myPacket : MIDIPacketPtr; myRefCon : LONGINT) : INTEGER;}
{}
{PROCEDURE myTimeProc(curTime : LONGINT; myRefCon : LONGINT);}
{}

{ MIDI Manager Routines }

  function SndDispVersion (toolnum: INTEGER): LONGINT;

  function MIDISignIn (ID: OSTYPE; refCon: longint; icon: Handle; name: STR255): OSErr;
  inline
    $203C, 4, midiToolNum, $A800;
  procedure MIDISignOut (ID: OSTYPE);
  inline
    $203C, 8, midiToolNum, $A800;
  function MIDIGetClients: MIDIIDListHdl;
  inline
    $203C, 12, midiToolNum, $A800;
  procedure MIDIGetClientName (ID: OSTYPE; var name: STR255);
  inline
    $203C, 16, midiToolNum, $A800;
  procedure MIDISetClientName (ID: OSTYPE; name: STR255);
  inline
    $203C, 20, midiToolNum, $A800;
  function MIDIGetPorts (clientID: OSTYPE): MIDIIDListHdl;
  inline
    $203C, 24, midiToolNum, $A800;
  function MIDIAddPort (clientID: OSTYPE; BufSize: integer; var refnum: integer; init:
       MIDIPortParamsPtr): OSErr;
  inline
    $203C, 28, midiToolNum, $A800;
  function MIDIGetPortInfo (clientID: OSTYPE; portID: OSTYPE): MIDIPortInfoHdl;
  inline
    $203C, 32, midiToolNum, $A800;
  function MIDIConnectData (srcClID, srcPortID, dstClID, dstPortID: OSTYPE): OSErr;
  inline
    $203C, 36, midiToolNum, $A800;
  function MIDIUnConnectData (srcClID, srcPortID, dstClID, dstPortID: OSTYPE): OSErr;
  inline
    $203C, 40, midiToolNum, $A800;
  function MIDIConnectTime (srcClID, srcPortID, dstClID, dstPortID: OSTYPE): OSErr;
  inline
    $203C, 44, midiToolNum, $A800;
  function MIDIUnConnectTime (srcClID, srcPortID, dstClID, dstPortID: OSTYPE): OSErr;
  inline
    $203C, 48, midiToolNum, $A800;
  procedure MIDIFlush (refnum: integer);
  inline
    $203C, 52, midiToolNum, $A800;
  function MIDIGetReadHook (refnum: integer): ProcPtr;
  inline
```

```
  $203C, 56, midiToolNum, $A800;
procedure MIDISetReadHook (refnum: integer; hook: ProcPtr);
inline
  $203C, 60, midiToolNum, $A800;
procedure MIDIGetPortName (client: OSTYPE; port: OSTYPE; var name: STR255);
inline
  $203C, 64, midiToolNum, $A800;
procedure MIDISetPortName (client: OSTYPE; port: OSTYPE; name: STR255);
inline
  $203C, 68, midiToolNum, $A800;
procedure MIDIWakeUp (refnum: integer; time: longint; period: longint; timeProc: ProcPtr);
inline
  $203C, 72, midiToolNum, $A800;
procedure MIDIRemovePort (refnum: integer);
inline
  $203C, 76, midiToolNum, $A800;
function MIDIGetSync (refnum: integer): integer;
inline
  $203C, 80, midiToolNum, $A800;
procedure MIDISetSync (refnum: integer; sync: integer);
inline
  $203C, 84, midiToolNum, $A800;
function MIDIGetCurTime (refnum: integer): longint;
inline
  $203C, 88, midiToolNum, $A800;
procedure MIDISetCurTime (refnum: integer; time: longint);
inline
  $203C, 92, midiToolNum, $A800;
procedure MIDIStartTime (refnum: integer);
inline
  $203C, 96, midiToolNum, $A800;
procedure MIDIStopTime (refnum: integer);
inline
  $203C, 100, midiToolNum, $A800;
procedure MIDIPoll (refnum: integer; offsetTime: longint);
inline
  $203C, 104, midiToolNum, $A800;
function MIDIWritePacket (refnum: integer; packet: MIDIPacketPtr): OSErr;
inline
  $203C, 108, midiToolNum, $A800;
function MIDIWorldChanged (clientID: OSTYPE): BOOLEAN;
inline
  $203C, 112, midiToolNum, $A800;
function MIDIGetOffsetTime (refnum: integer): longint;
inline
  $203C, 116, midiToolNum, $A800;
procedure MIDISetOffsetTime (refnum: integer; offsetTime: longint);
inline
  $203C, 120, midiToolNum, $A800;
function MIDIConvertTime (srcformat: integer; dstformat: integer; time: longint): longint;
inline
  $203C, 124, midiToolNum, $A800;
function MIDIGetRefCon (refnum: integer): longint;
```

```
inline
  $203C, 128, midiToolNum, $A800;
procedure MIDISetRefCon (refnum: integer; refCon: longint);
inline
  $203C, 132, midiToolNum, $A800;
function MIDIGetClRefCon (clientID: OSTYPE): longint;
inline
  $203C, 136, midiToolNum, $A800;
procedure MIDISetClRefCon (clientID: OSTYPE; refCon: longint);
inline
  $203C, 140, midiToolNum, $A800;
function MIDIGetTCFormat (refnum: integer): integer;
inline
  $203C, 144, midiToolNum, $A800;
procedure MIDISetTCFormat (refnum: integer; format: integer);
inline
  $203C, 148, midiToolNum, $A800;
procedure MIDISetRunRate (refnum: integer; rate: integer; time: longint);
inline
  $203C, 152, midiToolNum, $A800;
function MIDIGetClientIcon (ID: OSTYPE): Handle;
inline
  $203C, 156, midiToolNum, $A800;

implementation

end.
```

```
 { this unit contains the code to initialize and transmit MIDI notes.  }
{ note: the Midi library only allows for ports A and B.  Thus, if the}
{ MIDI bit in DA config bits is set, then MIDI gets the first crack at}
{ the A and B ports.}
{ InitMidiDMs must be called just once.  Later, the MIDI dms can}
{ transmit at will, provided that the MIDI has been initialized.}

{ last version 12.7.89}
{ by Scott Burgess}


unit midiDMs;

interface


  uses
    ChuckStuff, AutoLib, Globals, miscRoutines, Tree3DGlob, serialTypes, serialRoutines, DMTypes,{}
    DMGlobals, MIDI, initMIDI;

  procedure doBeep (var dm: DMRec);
  procedure doSustain (var dm: DMRec);
  procedure doAllNotesOff (var dm: DMrec);
  procedure doNoteOn (var dm: DMrec);
  procedure doController (var dm: DMRec);
  procedure doControl (var dm: DMrec);
  procedure doPitchBend (var dm: DMrec);
  procedure HandleMIDI (v: DMVerb; var dm: DMRec);

implementation

  const
    midiDebug = false;

  type
    mNotePtr = ^midiNote;
    midiNote = record
        endTime: longint;
        noteNum: integer;
        nextNote: mNotePtr;
      end;


  procedure doAllNotesOff;
    var
      x: integer;
      topNote, tmpNote, lastNote: mNotePtr;
  begin
    if midiState then
      begin  {only if midi is on}
        if (dm.slotsIn[0].ptrfrm^.i <> 0) then
          begin
```

```
        for x := 0 to 127 do        {turn off all notes}
          playNote(dm.privatewords[0], x, 0);

        tmpNote := mNotePtr(dm.private);
        while (tmpNote <> nil) do
          begin
            with tmpNote^ do
              begin
                lastNote := tmpNote;
                tmpNote := nextNote;
                disposPtr(ptr(lastNote));
              end;
          end;
        dm.private := nil;
      end;
    end;
end;


procedure doController;
begin
  if (midiState) then
    if (dm.SlotsIn[0].ptrfrm^.i > 0) then {trigger}
      with dm do
        controller(privateWords[0], SlotsIn[1].ptrfrm^.i, dm.SlotsIn[2].ptrfrm^.i);
end;


procedure doSustain;
begin
  if (midiState) then
    if (dm.SlotsIn[0].ptrfrm^.i <> 0) then  {trigger is true}
      if (dm.privateWords[1] = 0) then
        begin  { trigger, but no note}
          playNote(dm.privateWords[0], dm.SlotsIn[1].ptrfrm^.i, dm.SlotsIn[2].ptrfrm^.i);  {turn it on}
          dm.privateWords[2] := dm.SlotsIn[1].ptrfrm^.i;  {cache note number}
          dm.privateWords[1] := 1;  {turn on note playing status}
        end
      else
        begin  {trigger, but note - sustaining}
        end
    else
      begin
        if (dm.privateWords[1] = 0) then
          begin  {trigger is false}
          end {do nothing, no note is playing}
        else
          begin
            playNote(dm.privateWords[0], dm.privateWords[2], 0);  {turn off current note}
            dm.privateWords[1] := 0;  {turn off note playing status}
          end;
      end;
end;
```

```
procedure doPitchBend;
  var
    msb, lsb: integer;
begin
  if (midiState) then
    if (dm.SlotsIn[0].ptrfrm^.i > 0) then
      begin {trigger}
        lsb := BitAnd(dm.SlotsIn[1].ptrfrm^.i, $00FF);
        msb := BitAnd(BitShift(dm.SlotsIn[1].ptrfrm^.i, -8), $00FF);
        pitchBend(dm.privateWords[0], lsb, msb);
      end;
end;

procedure doNoteOn;
  var
    note: integer;
    topNote, tmpNote, newMNote, insertNote, prevNote, saveNote: mNotePtr;
    newNoteNeeded, killit: Boolean;
    timeOfEvent: longint;

begin
  if midiState then
    begin

{this part sets up the variables that are used}

      topNote := mNotePtr(dm.private);
      if dm.SlotsIn[0].ptrfrm^.i > 0 then    {trigger}
        newNoteNeeded := true
      else
        newNoteNeeded := false;

      note := dm.SlotsIn[1].ptrfrm^.i;

      timeOfEvent := MIDIGetCurTime(timePortRef);
      newMnote := nil;
      prevNote := nil;
      insertNote := nil;
      saveNote := nil;

      tmpNote := topNote;
      while (tmpNote <> nil) do
        begin
          killIt := false;
          with tmpNote^ do
            begin
              if midiDebug then
                announce(stringof('Checking note number ', noteNum));

              if (noteNum = note) and (newNoteNeeded) then
                begin {new note with same #}
                  playNote(dm.privateWords[0], noteNum, 0); {turn it off }
```

```
              newMnote := tmpNote;    {set it to be written over}
            end
          else if (endTime < timeofEvent) then
            begin  {its duration has passed}
              playNote(dm.privateWords[0], noteNum, 0);   {turn it off}

              if (tmpNote = topNote) then
                begin
                  dm.private := ptr(topNote^.nextNote);
                  topNote := tmpNote^.nextNote;
                end
              else
                prevNote^.nextNote := tmpNote^.nextNote;    {this is not the top note}

              killIt := true;
              if (midiDebug) then
                announce(stringof('Turning off note - disposing ', noteNum));
            end;
        end;
      if (tmpNote^.nextNote = nil) then
        insertNote := tmpNote;
      prevNote := tmpNote;
      saveNote := tmpNote;
      tmpNote := tmpNote^.nextNote;
      if (killIt) then
        disposPtr(ptr(prevNote));
      prevNote := saveNote;
    end;

    if newNoteNeeded then
      begin
        if (newMnote = nil) then
          begin {alloc new note}
            newMnote := mNotePtr(newPtr(sizeof(midiNote)));
            newMnote^.nextNote := nil;
            if (insertNote = nil) then
              dm.private := ptr(newMnote)
            else
              insertNote^.nextNote := newMnote;   {insert into list}
          end;
{else use old note }
        with newMnote^ do
          begin
            noteNum := note;
            endTime := timeOfEvent + dm.SlotsIn[3].ptrfrm^.i;
            playNote(dm.privateWords[0], noteNum, dm.SlotsIn[2].ptrfrm^.i);   {turn it on}
            if (midiDebug) then
              announce(stringof('Adding new note ', noteNum));
          end;
      end; {new note}

  end;  {if midibits}
end;  {procedure noteon}
```

```
procedure HandleMIDI; { (v : DMVerb; var dm : DMRec) }
  var
    i: integer;

  procedure resetLast;
    var
      i: integer;
      topNote, tmpNote, lastNote: mNotePtr;
  begin
    topNote := mNotePtr(dm.private);
    tmpNote := topNote;
    while (tmpNote <> nil) do
      begin
        with tmpNote^ do
          begin
            playNote(dm.privateWords[0], noteNum, 0); {turn it off }
            lastNote := tmpNote;
            tmpNote := nextNote;
            disposPtr(ptr(lastNote));
          end;
      end;
    dm.private := nil;
  end;

  procedure Calibrate (var dm: DMRec);
    var { calibrate this Const/Offset dm. }
      prompt1, str1: str255;
      p: DPtr;
      l: longInt;
      chan: longint;
      r: Real;
  begin
    with dm do
      begin
        p := DPtr(@dm.privateWords);
        prompt1 := concat(' MIDI DM"', dm.name, '".');
        prompt1 := StringOf(prompt1, chr(13), 'Enter the new MIDI channel:');
        str1 := ntos(dm.privatewords[0]);
        if GetStrings(prompt1, '', str1, str1) then
          begin
            StringtoNum(str1, chan);
            FileDirty[dmFile] := true;
            resetLast;
            dm.privateWords[0] := chan;
          end;
      end;
  end;

begin
  case v of
```

```
    initDM:             { Called once the first time this DM is started. }
      begin
        dm.private := nil;
        dm.privateWords[0] := 1;
        calibrate(dm);
{resetLast;}
      end;
    massageDM:          { Called once through the main loop.  do a massage }
      begin
        sysbeep(1);
        doNoteOn(dm);     { This shouldn't actually be called, doNoteOn is called directly. }
      end;
    closeDM:
      resetLast;                { Called at the end of the program run.  Do whatever... }
    reHookedDM:
      ;
    fopenDM:            { This DM has just been read from a file.  If it's state is }
                        { on it was hooked up properly.  private points to the }
      begin             { private memory it had when saved. }
        dm.private := nil;
      end;
    fsaveDM:            { This DM is about to be saved to a file.  Do any changes }
      begin             { nessessary to private memory so it can be restored later. }
        resetLast;
      end;
    calibDM:
      begin
        Calibrate(dm);              { Calibrate the DM module. }
      end;
    describeDM:
      ;
    writeCodeDM:
      begin
      end;
    otherwise           { Should be no other. }
      sysbeep(3);
   end;     { case }
  end;      { HandlePass }


  procedure doBeep (var dm: DMRec);
  begin
   if (dm.slotsIn[0].ptrfrm^.i <> 0) then
     SysBeep(2);
  end;

end.
```

```
unit MiscRoutines;

interface
  uses
    ChuckStuff, AutoLib, globals;

  type
    SuffixType = record
        n, dignum: integer;
        base: NameStr;
      end;


  function Ang_arcsin (s: real): integer;
  function Ang_arccos (cos: real): integer;

  function GetStrings (prompt1, prompt2: string; var str1, str2: str255): boolean;
  function OKCancel (str: string): boolean;
  function HexByte (b: Byte): string;
  function HexWord (word: integer): string;
  function HexLong (l: longInt): string;
  function ExFileName (base, suffix: string): string;

  procedure ExtractSuffix (name: NameStr; var suf: SuffixType);
  function AddSuffix (suf: SuffixType): NameStr;

  function NameMatch (str, str2: Str255; exact: Boolean): Boolean;
  function ValidName (str: Str255): NameStr;

implementation

  const
    RadtoDeg = 572.9577951;        { 1800 / pi.  radian to degree(*10) ratio. }
    DegtoRad = 0.0017453292;

    { Return the angle value for this sin . }
  function Ang_arcsin (s: real): integer;
  begin
{$ifc Option(MC68881) }
    Ang_arcsin := round(arcsin(s) * RadtoDeg);
{$elsec }
    Ang_arcsin := round(ArcTan(s / Sqrt(-(s * s) + 1)) * RadtoDeg);
{$endc }
  end;

  function Ang_arccos (cos: real): integer;
  begin
{$ifc Option(MC68881) }
    Ang_arccos := round(arccos(cos) * RadtoDeg);
{$elsec }
    Ang_arccos := round((-arctan(cos / sqrt(-(cos * cos) + 1)) + 1.5708) * RadtoDeg);
{$endc }
  end;
```

```
function GetStrings;
{ Put up a dialog box with the given prompt strings and get two more strings from }
{ the user. If prompt2 is blank then don't show a prompt or an edit box. }
{ Return true if the user hit OK. }
   const
     getstrID = 1551;
       { sequence number for just edit item. }
     str1Ednum = 1;
     str2Ednum = 2;
       { actual string item numbers }
     str1dItem = 3;
     str2dItem = 4;
   var
     dlogPtr: DialogPtr;
     i, itemHit: Integer;
     str: str255;
  begin
    ParamText(prompt1, prompt2, '', '');
    i := getstrID;
    if prompt2 <> '' then
      i := i + 1;
    dlogPtr := GetNewDialog(i, nil, Pointer(-1));
    PositionWindow(dlogPtr, 50, 10);
    SetEdText(dlogPtr, str1Ednum, str1);
    if prompt2 <> '' then
      SetEdText(dlogPtr, str2Ednum, str2);
    if false then
      HideDItem(dlogPtr, str2dItem);
    SelIText(dlogPtr, str1dItem, 0, 32767);
    ShowWindow(dlogPtr);
    repeat
      ModalDialog(nil, itemHit);
    until itemHit <= 2; { Until OK or Cancel is clicked. }
    if itemHit = 1 then
      begin { OK clicked. }
        GetEdText(dlogPtr, str1Ednum, str1);
        if prompt2 <> '' then
          GetEdText(dlogPtr, str2Ednum, str2);
        GetStrings := true;
      end
    else
      GetStrings := false;
    DisposDialog(dlogPtr);
  end;{ GetStrings }

  function OKCancel; { (str : string) : boolean }
{ Put up the OKCancel dialog box with this string. Return true if the user clicks }
{ OK, else return false. }
   var
     dlog: DialogPtr;
     itemHit: integer;
  begin
```

```
    paramText(str, '', '', '');
    dlog := GetNewDialog(OKCancelID, nil, Pointer(-1));
    PositionWindow(dlog, 50, 30);
    ShowWindow(dlog);
    repeat
      ModalDialog(nil, itemHit);
    until itemHit <= 2;
    OKCancel := (itemHit = 1);
    DisposDialog(dlog);
  end;

{ Return the hex string for this 8-bit byte. }
  function HexByte; {•(b : Byte) : string;•}
    var
      i, j: integer;
      str, hexstr: string;
  begin
    str := '  ';
    hexstr := '0123456789ABCDEF';
    for i := 1 downto 0 do
      begin
        str[i + 1] := hexstr[bitAnd(b, $F) + 1];
        b := bitShift(b, -4);
      end;
    HexByte := str;
  end;

{ Return the hex string for this 16-bit word. }
  function HexWord; {•(word : integer) : string;•}
    var
      i, j: integer;
      str, hexstr: string;
  begin
    str := '    ';
    hexstr := '0123456789ABCDEF';
    for i := 3 downto 0 do
      begin
        str[i + 1] := hexstr[bitAnd(word, $F) + 1];
        word := bitShift(word, -4);
      end;
    HexWord := str;
  end;

{ Return the hex string for this 32-bit long. }
  function HexLong;{•(l : LongInt) : string;•}
    var
      i, j: integer;
      str, hexstr: string;
  begin
    str := '        ';
    hexstr := '0123456789ABCDEF';
    for i := 7 downto 0 do
      begin
```

```
      str[i + 1] := hexstr[bitAnd(l, $F) + 1];
      l := bitShift(l, -4);
    end;
  HexLong := str;
end;

function ExFileName; { (base, suffix: string): string }
  { Return 'base.suffix'.  If base already has a '.' in it replace chars }
  { after it with suffix.  If base is nul make the name 'untitled.suffix'. }
  var
    i: integer;
begin
  if base = '' then
    base := 'untitled';
  i := Pos('.', base);
  if i <> 0 then
    Delete(base, i, 255);
  ExFileName := concat(base, '.', suffix);
end;

procedure ExtractSuffix (name: NameStr; var suf: SuffixType);
      { Extract the Suffix that is just digits from the given name and fill the suf }
      { record with the information needed to restore it. }
  var
    i, j: integer;
begin
  j := 0;
  for i := length(name) downto 1 do
    if (name[i] >= '0') and (name[i] <= '9') then
      j := j + 1
    else
      leave;
  with suf do
    begin
      base := copy(name, 1, length(name) - j);
      if j <> 0 then
        n := StringtoInt(copy(name, length(name) - j + 1, length(name)))
      else
        n := 0;
      dignum := j;
    end;
end;

function AddSuffix (suf: SuffixType): NameStr;
      { Return a string that has the original base with the new numeric Suffix added to the end of it. }
  var
    i: integer;
begin
  with suf do
    begin
      if (dignum = 0) and (n = 0) then
        AddSuffix := base
      else
```

```
      AddSuffix := copy(concat(base, ntos(n)), 1, NameSize);
    end;
  end;

  function NameMatch (str, str2: Str255; exact: Boolean): Boolean;
   { Return true if the names given match.  If exact is false return true if str is in str2. }
   { assume that str has already been capitalized. }
  begin
   if exact then
    NameMatch := EqualString(str, str2, false, true)
   else
    begin
     UprString(str2, true);
     NameMatch := pos(str, str2) <> 0;
    end;
  end;

  function ValidName (str: Str255): NameStr;
   { Clip the given string to a valid NameStr length. }
  begin
   ValidName := copy(str, 1, NameSize);
  end;

end.
```

```
unit MacADIOSutils;

interface

  uses
    chuckstuff, AutoLib, globals;

  const

    STATUS = $20;
    MODE = $60;
    MUX = $58;
    CONVERT_CMD = $78;
    AD_CONV = $000;
    DIG_OUT = $50;
    DIG_IN = $08;
    DAC_OUT0 = $40;
    DAC_OUT1 = $48;

    HALF_NUMFLEX = 8;
    BUSY_MASK = $0001;
    NUM_GLOVES = 4;

{adiosBright = 768;3.75volts}
    adiosBright = 820;   {4.0 volts}

    oneGlove = 4;
    twoGloves = 5;
    dataSuit = 6;
    controls = 3;

  type

    adios_regs_ptr = ^adios_registers;
    adios_registers = record
        MUXAddr: intPtr;            { Multiplexer register }
        CCAddr: intPtr;           { Convert command register }
        ADAddr: intPtr;           { A/D converter }
        StatAddr: intPtr;         { Status register }
        ModeAddr: intPtr;           { Mode register }
        DigInAddr: intPtr;          { digital out register }
        DA0Addr: intPtr;          { digital-analog 0 }
        DA1Addr: intPtr;
        DigOutAddr: intPtr;
      end;

  var
    adios_regs: adios_regs_ptr;
    LastData: integer;          { One bit debounce. }
    lastglove: integer;
    tDIGOAddr: integer;
    adiosDAR: DARec;
    digOutData: integer;          { global to keep track of what is dig out}
```

-000492

```
  xDigInAddr, xDigOutAddr: IntPtr; { Calculated Addr's of MacAdios digital input and output ports. }


 procedure init_adios (slot: integer);
 procedure close_adios;
 function read_adios_C (p: ptr; AtoD: Boolean): integer;
 function get_suit (where: intPtr): integer;


 procedure writeDig (data, mask: integer);

implementation

 procedure writeDig (data, mask: integer);
  var
   tmp1, tmp2: integer;
 begin
  tmp1 := BAND(digOutData, BNOT(mask));
  tmp2 := BAND(mask, data);
  digOutData := BOR(tmp1, tmp2);
  adios_regs^.DigOutAddr^ := digOutData;
 end;


 procedure init_adios (slot: integer);  {sets global variables}
  var
   SLOT_OFFSET: longint;
 begin

  adios_regs := adios_regs_ptr(newPtr(sizeof(adios_registers)));

  SLOT_OFFSET := ($F8800000 + ($01100000 * slot));

  with adios_regs^ do
   begin
    MUXAddr := intPtr(SLOT_OFFSET + MUX);
    CCAddr := intPtr(SLOT_OFFSET + CONVERT_CMD);
    ADAddr := intPtr(SLOT_OFFSET + AD_CONV);
    ModeAddr := intPtr(SLOT_OFFSET + MODE);
    StatAddr := intPtr(SLOT_OFFSET + STATUS);
    DigInAddr := intPtr(SLOT_OFFSET + DIG_IN);
    DA0Addr := intPtr(SLOT_OFFSET + DAC_OUT0);
    DA1Addr := intPtr(SLOT_OFFSET + DAC_OUT1);
    DigOutAddr := intPtr(SLOT_OFFSET + DIG_OUT);


    DA0Addr^ := adiosBright;                {sets the brightness }
    DA1Addr^ := adiosBright;                {sets the brightness }

    lastglove := 3;
    tDIGOAddr := 0;
```

```
      digOutData := $80;
      ModeAddr^ := BitAnd(ModeAddr^, $00F8);     {set mode - gain =1, A/D on}
    end;
  end;

  procedure close_adios;
  begin
    disposPtr(ptr(adios_regs));
  end;


  function read_adios (where: ptr): integer;
  begin

  end;


  function read_adios_C (p: ptr; AtoD: Boolean): integer;
    var
      data, x: integer;
      bits: longint;
      tPtr: intptr;
      temp: integer;
  begin
    read_adios_C := noErr;

    with adios_regs^ do
      begin
        data := DigInAddr^;
        data := BitAnd(data, $00FF);

        If data <> LastData then         { One bit debounce because I was getting noise. CLB }
          LastData := data
        else
          begin
            LastData := data;
            tPtr := intPtr(p);

            for x := 0 downto -7 do
              begin
                bits := bitShift(data, x);
                if BitAnd(bits, $0001) > 0 then
                  tPtr^ := integer(1)
                else
                  tPtr^ := integer(0);
                tPtr := intptr(ord4(tPtr) + 2);
              end;

            If AtoD then
              begin
                for x := 8 to 9 do
                  begin
                    MUXAddr^ := x;
```

```
          MODEaddr^ := BitAnd(MODEaddr^, $F8);
          CCaddr^ := 0;
          repeat
          until (BitAnd(StatAddr^, $01) > 0);
          CCaddr^ := 0;
          tPtr^ := ADAddr^;
          tPtr := intptr(ord4(tPtr) + 2);
        end;
      end;
    end;
  end;
end;



function get_suit (where: intPtr): integer;
 var
   flex: integer;
   timer: integer;
   glove: integer;
   tempVar: integer;
   last_dig_out: integer;
   counter: integer;
   flexs: integer;
   base_array: intPtr;
   bank: integer;
begin
  get_suit := 0;
  counter := 0;
  base_array := where;

  with adios_regs^ do
   begin

    for bank := 0 to 1 do
     begin
      if bank = 1 then
        where := intptr(ord4(base_array) + 2);

      for glove := 0 to NUM_GLOVES - 1 do
        begin

         for flex := 0 to HALF_NUMFLEX - 1 do
          begin

           if (glove < 2) then
             MUXAddr^ := flex + (glove * HALF_NUMFLEX)
           else
             MUXAddr^ := 96 + flex + ((glove - 2) * HALF_NUMFLEX);


           for tempVar := 1 to 25 do {wait}
```

-000495

```
                timer := timer + 1;

              CCAddr^ := $0000;  {Convert command }

   {wait until not busy }
              timer := 0;
              while ((BitAnd(StatAddr^, BUSY_MASK) = 0) and (timer < 500)) do
                timer := timer + 1;

              if (timer = 500) then
                get_suit := -1;

              CCAddr^ := $0000;

              where^ := ADAddr^;
              where := intptr(ord4(where) + 4);

            end;

          tDIGOAddr := BitXor(tDIGOAddr, BitShift(1, glove));
          writeDig(tDIGOAddr, $0F);

{where := intptr(ord4(where) + (16));}
         end;

        with adios_regs^ do
         begin
{read the Boom once first.}
          MUXAddr^ := 112;   {mux channel 16 for boom}
          for tempVar := 1 to 25 do  {wait}
            timer := timer + 1;
          CCAddr^ := $0000;  {Convert command }

   {wait until not busy }
          timer := 0;
          while ((BitAnd(StatAddr^, BUSY_MASK) = 0) and (timer < 500)) do
            timer := timer + 1;
          if (timer = 500) then
            get_suit := -1;
          CCAddr^ := $0000;
          where^ := ADAddr^;
         end;
        where := intptr(ord4(base_array) + 2);

      end;
    end;
  end;


end.
```

-000436

```
unit PointDMs;
Interface
  uses
    FixMath, FastStuff, AutoLib, chuckstuff, scottsStuff, Globals, Tree3DGlob, MiscRoutines, {}
    formTree3D, TreeEdit, Tree3D, DMTypes, DMGlobals, TrigDMs;

  type
    PRecPtrPtr = ^PRecPtr;
    WhichAxis = (doX, doY, doZ);

  procedure doFollowPt (var dm: DMRec);

  procedure do2ndFollow (var dm: DMRec);

  procedure doGlobDelta (var dm: DMRec);
  procedure doGlobDistance (var dm: DMRec);

  procedure doPtOffset (var dm: DMRec);
  procedure HandlePtOffset (v: DMVerb; var dm: DMRec);

  procedure doGlobPos (var dm: DMRec);

  procedure doHitTest (var dm: DMRec);
  procedure HandleHitTest (v: DMVerb; var dm: DMRec);

  procedure doSpecialScale (var dm: DMRec);
  procedure HandleSpecialScale (v: DMVerb; var dm: DMRec);

  procedure doInPointList (var dm: DMRec);
  procedure HandleInPointList (v: DMVerb; var dm: DMRec);

  procedure doPolhemusDM (var dm: DMRec);
  procedure HandlePolhemusDM (v: DMVerb; var dm: DMRec);

  procedure calcLookAt (look, at: PRecPtr; which: WhichAxis; neg: Boolean);
  procedure doWatchPt (var dm: DMRec);
  procedure HandleWatchPt (v: DMVerb; var dm: DMRec);

implementation

  type
    OffsetInfo = record
        unused: LongInt;          { used to be the input pointer. }
        lastControl: integer;
        offsets: SixType;
      end;
    OffsetInfoPtr = ^OffsetInfo;

  procedure doFollowPt;
    var
      i: integer;
  begin
    if (dm.PointsOut[0].ptrto <> nil) and (dm.PointsOut[1].ptrto <> nil) then
```

```
    with dm.PointsOut[1] do
      begin
        DirtyConvert(dm.PointsOut[0].ptrto);
        ptrto^.gPt := dm.PointsOut[0].ptrto^.gPt;
        unConvert(ptrto);
        ptrto^.dirty := true;
        for i := 0 to 2 do
          SetSixth(ptrto, i, ptrto^.lSix.s[i]);    { Call SetSixth so it can limit to constraints. }
      end;
  end;

{-----------------------------------------------------------------------------}
{ 2 Inputs, 1 output. }
{ Input 1 = point to follow, input 2 = boolean, output = point to follow with. }
{ The 2ndFollowPt also chases one point with another by just changing local x,y and z.  However }
{ it's second input is a boolean input which say's whether to do it or not. }
{ and it's first input is the point to follow. }

  procedure do2ndFollow;
    var
      i: integer;
      p: PRecPtr;
  begin
    with dm do
      if SlotsIn[1].ptrfrm^.i <> 0 then
        begin
          p := PRecPtr(SlotsIn[0].ptrfrm);
          with PointsOut[0] do
            if (ptrto <> nil) then
              begin
                DirtyConvert(p);
                ptrto^.gPt := p^.gPt;
                unConvert(ptrto);
                ptrto^.dirty := true;
                for i := 0 to 2 do
                  SetSixth(ptrto, i, ptrto^.lSix.s[i]);    { Call SetSixth so it can limit to constraints. }
              end;
        end;
  end;

{-----------------------------------------------------------------------------}
{ 2 Inputs, 3 output. }
{ The outputs are the global x,y and z delta's of the first point input - the second point input. }
{ Note that both inputs are assumed to be points or this DM won't work. }

  type
    TwoPRecPtrs = record
        p1, p2: PRecPtr;
      end;
    TwoPRecPtrsPtr = ^TwoPRecPtrs;

  procedure doGlobDelta;
    var
```

```
    i: integer;
    p0, p1: PRecPtr;
    s1, s2: SixPtrType;
  begin
    with dm do
      begin
        p0 := PRecPtr(SlotsIn[0].ptrfrm);
        p1 := PRecPtr(SlotsIn[1].ptrfrm);
        DirtyConvert(p0);
        DirtyConvert(p1);
        s1 := SixPtrType(@p0^.gPt);
        s2 := SixPtrType(@p1^.gPt);
        for i := 0 to 2 do
          with PointsOut[i] do
            begin
              LastValue.i := s1^.s[i] - s2^.s[i];
              if ptrto <> nil then
                SetSixth(ptrto, ord(SixAxis), LastValue.i);
            end;
      end;
  end;

{-----------------------------------------------------------------------------}
{ 2 Inputs, 1 output. }
{ The output is the distance in global coordinates between these two points. }
{   dist := sqrroot( x*x + y*y + z*z) }

  procedure doGlobDistance (var dm: DMRec);
    var
      i: integer;
      p0, p1: PRecPtr;
      s0, s1: SixPtrType;
      l, total: longInt;
  begin
    with dm do
      begin
        p0 := PRecPtr(SlotsIn[0].ptrfrm);
        p1 := PRecPtr(SlotsIn[1].ptrfrm);
        DirtyConvert(p0);
        DirtyConvert(p1);

        total := 0;
        s0 := SixPtrType(@p0^.gPt);
        s1 := SixPtrType(@p1^.gPt);
        for i := 0 to 2 do
          begin
            l := (s0^.s[i] - s1^.s[i]);
            total := total + (l * l);
          end;
        with PointsOut[0] do
          begin
            case outType of
              intD:
```

```
          LastValue.i := round(sqrt(total));
        longD:
          LastValue.l := round(sqrt(total));
        fixedD:
          LastValue.f := X2Fix(sqrt(Fix2X(total)));
        realD:
          LastValue.r := sqrt(total);
      end;
      if ptrto <> nil then
        SetSixthType(ptrto, ord(SixAxis), LastValue, outType);
    end;
  end;
end;

{---------------------------------------------------------------------------------}
{ 2 Inputs, 1 output. }
{ The PtOffset DM sets the output point to the input point with a given offset. }
{ This DM has two inputs. The first is any pos of a tree point. The second is a boolean input. }
{ If the second input is true (non-zero) the output point is set to the input point with }
{ the stored offset. The offset is calculated when the second input goes from false to true. }

procedure doPtOffset;
  var
    i: integer;
    optr: OffsetInfoPtr;
    p: PRecPtr;
    frmSixptr, toSixptr: SixPtrType;
begin
  optr := OffsetInfoPtr(dm.private);
  p := PRecPtr(dm.SlotsIn[0].ptrfrm);
  if (dm.PointsOut[0].ptrto <> nil) then
    begin
      frmSixPtr := SixPtrType(@p^.lSix.pt);
      toSixPtr := SixPtrType(@dm.PointsOut[0].ptrto^.lSix.pt);
      if (dm.SlotsIn[1].ptrfrm^.i <> 0) and (optr^.lastControl = 0) then
        begin
          { leading edge transition from false to true. Set new offsets }
          for i := 0 to 5 do
            optr^.offsets.s[i] := toSixPtr^.s[i] - frmSixPtr^.s[i];
        end;
      optr^.lastControl := dm.SlotsIn[1].ptrfrm^.i;
      if optr^.lastControl <> 0 then
        with dm.PointsOut[0] do
          begin
            for i := 0 to 5 do
              SetSixth(ptrto, i, frmSixPtr^.s[i] + optr^.offsets.s[i]);
            DirtyConvert(ptrto);
          end;
    end;
end;

procedure HandlePtOffset; { (v : DMVerb; var dm : DMRec) }
  var
```

```
    i: integer;
    optr: OffsetInfoPtr;
    h: Handle;
  procedure Reset;
    var
      i: integer;
      optr: OffsetInfoPtr;
  begin
    optr := OffsetInfoPtr(dm.private);
    optr^.unused := 0;
{   for i := 0 to 5 do optr^.offsets.s[i] := 0; }
  end;

 begin
  case v of
   initDM:              { Called once the first time this DM is started. }
     begin
       if dm.private <> nil then
         doClose(dm);
       h := NewHandle(sizeof(OffsetInfo));
       if h <> nil then
         begin
           MoveHHi(h);
           HLock(h);
           dm.private := h^;
           optr := OffsetInfoPtr(dm.private);
           Reset;
         end
       else
         begin
           Announce('Not enough memory to open this Point Offset DM');
           dm.state := usrOff;
         end;
     end;
   massageDM:           { Called once through the main loop.  do a massage }
     begin
       doPtOffset(dm);          { This shouldn't actually be called, doPass is called directly. }
     end;
   closeDM:
     ;                  { Called at the end of the program run.  Do whatever... }
   reHookedDM:
     Reset;
   fopenDM:             { This DM has just been read from a file.  If it's state is }
                        { on it was hooked up properly.  private points to the }
     begin              { private memory it had when saved. }
       Reset;
     end;
   fsaveDM:             { This DM is about to be saved to a file.  Do any changes }
     begin              { nessessary to private memory so it can be restored later. }
     end;
   calibDM:
     ;                  { Calibrate the DM module. }
   describeDM:
```

```
      ;
    writeCodeDM:
      ;
    otherwise       { Should be no other. }
      sysbeep(3);
  end;       { case }
end;         { }

{-----------------------------------------------------------------------------}
{ 1 Input, 3 outputs. }
{ The Global Pos DM sets the 3 outputs to the current global x, y and z of the point the }
{ given input is from.  If not from a point the outputs are zeros. }
{ This cashes the real address of a point in it's privatewords and the massage uses that. }
{ Everytime the DM's are rehooked up this gets a rehookup messaged and re-cashes the addr. }

procedure doGlobPos;
  var
    p: PRecPtr;
    sp: SixPtrType;
    i: integer;
begin
  p := PRecPtr(dm.SlotsIn[0].ptrfrm);
  DirtyConvert(p);
  sp := SixPtrType(@p^.gPt);
  for i := 0 to 2 do
    with dm.PointsOut[i] do
      begin
        LastValue.i := sp^.s[i];
        SetSixth(ptrto, i, LastValue.i);
      end
end;

{-----------------------------------------------------------------------------}
{ 'HitTest' - 6 Inputs, 5 outputs. }
{ The first input is a boolean control line.  The other 5 inputs must be from points.  When hooked }
{ up the DM caches the points real address and uses that.  The first point is the hot point. }
{ While the control line is true, the global position of the hot point is compared with all the other }
{ points.  If any of them are close enough as defined by the preset threshold values then that }
{ point is hit.  The first output becomes the index 1..4 of the point that was hit and the output }
{ that corresponds to the point input becomes true. }

{                        |----------|                          }
{  control  ------>      |          |  --> Current Grab (0..4) }
{  hotPoint  ----->      |          |  --> unused              }
{  Grab1  ------->       |          |  --> True if Grab1 grabbed }
{  Grab2  ------->       |          |  --> True if Grab2 grabbed }
{  Grab3  ------->       |          |  --> True if Grab3 grabbed }
{  Grab4  ------->       |          |  --> True if Grab4 grabbed }
{                        |----------|                          }

{ In the DM's calibration you can set the x,y,z threshold values, whether to drag on grab, and }
{ If the grab stays true even if the x,y,z goes out of range. }
```

```
type
  HitInfo = record
      gotHit,                     { True if currently have a hit. }
      alwaysTest, doDrag, doAng: boolean;
      ClosePtr: PRecPtr;      { If gotHit this is the point that is close. }
      threshold: Point3D;
      offsets: SixType;
      useBounds: boolean;
    end;
  HitInfoPtr = ^HitInfo;

  oldHitInfo = record
      hotPtr: PRecPtr;
      PtPtr: array[1..4] of PRecPtr;
      gotHit, alwaysTest, doDrag, doAng: boolean;
      hitIdx: integer;
      threshold: Point3D;
      offsets: SixType;
    end;
  oldHitInfoPtr = ^oldHitInfo;

procedure OutputFalse (var dm: DMRec);
  { Set all the outputs in this HitTest DM to false. }
  var
    i: integer;
    iptr: HitInfoPtr;
begin
  iptr := HitInfoPtr(dm.private);
  iptr^.gotHit := false;
  iptr^.ClosePtr := nil;
  for i := 0 to dm.outputs - 1 do
    with dm.PointsOut[i] do
      begin
        LastValue.i := 0;
        SetSixth(ptrto, ord(SixAxis), LastValue.i);
      end;
end;

procedure doHitTest;
  var
    i, j: integer;
    iptr: HitInfoPtr;
    sixPtr: SixPtrType;
    HotPtr: PRecPtr;
    pp: PrecPtrPtr;

  function InsideCube (testPt, cubePt: PRecPtr): Boolean;
  { Return true if the test point is inside the minPt and maxPt. }
  { Do this by making a temp point down from cubePt and puting the global position from }
  { testPt into local positions.  Then just compare orthogonal values for x,y and z. }
    var
      p, p1: PRecPtr;
      temp: PointRec;
```

```
begin
  InsideCube := false;
  p := cubePt^.down^.down;
  p1 := p^.right;
  temp.up := cubePt;
  temp.gPt := testPt^.gPt;
  UnConvert(@temp);
  with temp.lSix.pt do
    begin
      if x < p^.lSix.pt.x then
        exit(InsideCube);
      if y < p^.lSix.pt.y then
        exit(InsideCube);
      if z < p^.lSix.pt.z then
        exit(InsideCube);
      if x > p1^.lSix.pt.x then
        exit(InsideCube);
      if y > p1^.lSix.pt.y then
        exit(InsideCube);
      if z > p1^.lSix.pt.z then
        exit(InsideCube);
    end;
  InsideCube := true;
end;

function CloseEnough (ptest, pto: PRecPtr): boolean;
    { Return true if ptest is close enough to pto to be considered a hit. }
  var
    p, p1: PRecPtr;
    tmin, tmax: Point3d;
begin
  CloseEnough := false;
  if iptr^.useBounds then
    begin
        { use the down points min and max for proximity }
      DirtyConvert(pto);
      p := pto^.down;
      if p = nil then
        exit(CloseEnough);
      p := p^.down;
      if p = nil then
        exit(CloseEnough);
      p1 := p^.right;
      if p1 = nil then
        exit(CloseEnough):
      with tmax do
        begin
          x := MaxOf(abs(p^.lSix.pt.x), p1^.lSix.pt.x);
          y := MaxOf(abs(p^.lSix.pt.y), p1^.lSix.pt.y);
          z := MaxOf(abs(p^.lSix.pt.z), p1^.lSix.pt.z);
          if abs(ptest^.gPt.x - pto^.gPt.x) <= x then            { if the point is inside the max orthogonal
    cube }
            if abs(ptest^.gPt.y - pto^.gPt.y) <= y then
```

```
          if abs(ptest^.gPt.z - pto^.gPt.z) <= z then
            CloseEnough := InsideCube(ptest, pto);        { Then see if it is in the rotated cube. }
        end;
      end
    else
      begin     { use the constants in the calibration for proximity.  }
        with iptr^ do
          begin
            if abs(ptest^.gPt.x - pto^.gPt.x) < threshold.x then
              if abs(ptest^.gPt.y - pto^.gPt.y) < threshold.y then
                if abs(ptest^.gPt.z - pto^.gPt.z) < threshold.z then
                  CloseEnough := true;
          end;
      end;
  end;

begin      { doHitTest }
  iptr := HitInfoPtr(dm.private);
  with iptr^, dm do
    begin
      hotPtr := PRecPtr(SlotsIn[1].ptrfrm);
      if (SlotsIn[0].ptrfrm^.i = 0) then
        begin                     { if Control not true }
          if (PointsOut[0].LastValue.i <> 0) then
            begin           { then if outputs true then set them to false. }
              OutputFalse(dm);
            end;
        end
      else if gotHit then
        begin                              { else if control true and gotHit then }
          DirtyConvert(hotPtr);
          if alwaysTest then
            begin                          { if always test for collision then do it. }
              DirtyConvert(ClosePtr);
              if not CloseEnough(hotPtr, ClosePtr) then
                OutputFalse(dm);
            end;
          if gotHit and doDrag then
            begin                          { if still got a hit and this DM is dragging then }
              ClosePtr^.gPt.x := hotPtr^.gPt.x + offsets.s[0];          { do the drag. }
              ClosePtr^.gPt.y := hotPtr^.gPt.y + offsets.s[1];
              ClosePtr^.gPt.z := hotPtr^.gPt.z + offsets.s[2];
              unConvert(ClosePtr);
              for i := 0 to 2 do
                SetSixth(ClosePtr, i, ClosePtr^.ISix.s[i]);                    { Call SetSixth so it can limit
        to constraints. }
              if doAng then
                begin
                  for i := 3 to 5 do
                    SetSixth(ClosePtr, i, hotPtr^.ISix.s[i] + offsets.s[i]);
                end;
            end;
        end
```

=000505

```
else
 begin                                          { Else look for a new collision. }
  DirtyConvert(hotPtr);
  ClosePtr := nil;
  for i := 2 to inputs - 1 do
   begin
    case SlotsIn[i].inType of
     pointListD:      { ptrfrm^ in a pointList is an addr to a nil terminated list of PRecPtrs. }
      begin
       pp := PRecPtrPtr(SlotsIn[i].ptrfrm);
       while pp^ <> nil do
        begin
         if CloseEnough(hotPtr, pp^) then
          begin
           ClosePtr := pp^;
           leave;
          end;
         pp := PRecPtrPtr(ord4(pp) + 4);
        end;
      end;
     pointD:
      begin
       DirtyConvert(PRecPtr(SlotsIn[i].ptrfrm));
       if CloseEnough(hotPtr, PRecPtr(SlotsIn[i].ptrfrm)) then
        ClosePtr := PRecPtr(SlotsIn[i].ptrfrm);
      end;
    end;     { case }
    if ClosePtr <> nil then
     leave;
   end;
  if ClosePtr <> nil then
   begin     { Found one }
    gotHit := true;                            { Set internal state }
    if doDrag then
     begin
      sixPtr := SixPtrType(@ClosePtr^.gPt);
      for j := 0 to 2 do
       offsets.s[j] := sixPtr^.s[j] - SixPtrType(@hotPtr^.gPt)^.s[j];
      for j := 3 to 5 do
       offsets.s[j] := hotPtr^.lSix.s[j] - ClosePtr^.lSix.s[j];
     end;
    with PointsOut[0] do
     begin                    { Set first output to true }
      LastValue.i := i - 1;
      SetSixth(ptrto, ord(SixAxis), LastValue.i);
     end;
    for j := 2 to dm.outputs - 1 do            { And set the other outputs to false }
     with dm.PointsOut[j] do
      begin
       if j = i then                      { Except the one for this. }
        LastValue.i := 1
       else
        LastValue.i := 0;
```

```
                SetSixth(ptrto, ord(SixAxis), LastValue.i);
              end;
          end;
        end;
    end;        { with iptr, dm }
  end;

{ After every input hookup, recalculate and cashe the inputs points addr in }
{ the dm's private words. }
  procedure HandleHitTest; { (v : DMVerb; var dm : DMRec) }
    var
      i: integer;
      iptr: HitInfoPtr;
      optr: OldHitInfoPtr;
      h, h1: Handle;
      size: LongInt;

    procedure UserSetup;
      const
        hitTestCallD = 2015;
        xItem = 3;
        yItem = 4;
        zItem = 5;
        alwaysItem = 6;
        dragItem = 7;
        anglesItem = 8;
        useBoundsItem = 9;
      var
        iptr: HitInfoPtr;
        theDLOG: dialogPtr;
        itemHit: integer;
        oldHit: HitInfo;
    begin
      iptr := HitInfoPtr(dm.private);
      oldHit := iptr^;
      theDLOG := GetNewDialog(hitTestCallD, nil, pointer(-1));

{ initialize values for the dialog box }
      if iptr^.alwaysTest then
        RadioOn(theDLOG, alwaysItem, true);
      if iptr^.doDrag then
        RadioOn(theDLOG, dragItem, true);
      if iptr^.doAng then
        RadioOn(theDLOG, anglesItem, true);
      RadioOn(theDLOG, useBoundsItem, iptr^.useBounds);

      NumToEditText(theDLOG, xItem, iptr^.threshold.x);
      NumToEditText(theDLOG, yItem, iptr^.threshold.y);
      NumToEditText(theDLOG, zItem, iptr^.threshold.z);


      showWindow(theDLOG);
      paramText(dm.Name, '', '', '');
```

```
      repeat
        modalDialog(nil, itemHit);
        with iptr^ do
          begin
            case itemHit of
              alwaysItem:
                begin
                  if alwaysTest then
                    alwaysTest := false
                  else
                    alwaysTest := true;
                  RadioOn(theDLOG, alwaysItem, alwaysTest);
                end;
              dragItem:
                begin
                  if doDrag then
                    doDrag := false
                  else
                    doDrag := true;
                  RadioOn(theDLOG, dragItem, doDrag);
                end;
              anglesItem:
                begin
                  if doAng then
                    doAng := false
                  else
                    doAng := true;
                  RadioOn(theDLOG, anglesItem, doAng);
                end;
              useBoundsItem:
                begin
                  useBounds := not useBounds;
                  RadioOn(theDLOG, useBoundsItem, useBounds);
                end;
              otherwise
                ;
            end;
          end;
      until itemHit <= 2;
      if itemHit = 1 then
        begin
          iptr^.threshold.x := getNumFromEditText(theDLOG, xItem);
          iptr^.threshold.y := getNumFromEditText(theDLOG, yItem);
          iptr^.threshold.z := getNumFromEditText(theDLOG, zItem);
        end
      else
        iptr^ := oldHit;
      disposDialog(theDLOG);
    end;

  begin
    case v of
      initDM:          { Called once the first time this DM is started. }
```

```
begin
  if dm.private <> nil then
    doClose(dm);
  h := NewHandle(sizeof(HitInfo));
  if h <> nil then
    begin
      MoveHHi(h);
      HLock(h);
      dm.private := h^;
      iptr := HitInfoPtr(dm.private);
      with iptr^ do
        begin
          alwaysTest := false;
          doDrag := false;
          doAng := false;
          useBounds := false;
          threshold.x := 20;
          threshold.y := 20;
          threshold.z := 20;
        end;
      UserSetup;
      OutputFalse(dm);
    end
  else
    begin
      Announce('Not enough memory to open this HitTest DM');
      dm.state := usrOff;
    end;
end;
massageDM:          { Called once through the main loop. do a massage }
  begin
  end;
calibDM:
  UserSetup;
reHookedDM:
  OutputFalse(dm);
fopenDM:
  begin
    h1 := RecoverHandle(dm.private);
    size := GetHandleSize(h1);
    if size <> sizeof(HitInfo) then
      begin
          { Older style HitInfo record, Make a new one and fill it out. }
        h := NewHandle(sizeof(HitInfo));
        if h <> nil then
          begin
            MoveHHi(h);
            HLock(h);
            dm.private := Pointer(h^);
            iptr := HitInfoPtr(dm.private);
            optr := OldHitInfoPtr(h1^);
            with iptr^ do
              begin
```

```
                gotHit := false;
                alwaysTest := optr^.alwaysTest;
                doDrag := optr^.doDrag;
                doAng := optr^.doAng;
                threshold := optr^.threshold;
                useBounds := false;
              end;
            end;
          DisposHandle(h1);
        end;
      OutputFalse(dm);
    end;
   otherwise
    GenericHandle(v, dm);
  end;     { case }
 end;      { HandleHitTest }

{-----------------------------------------------------------------------------}
{ 4 inputs, 1 output. }
{ 'ScaleUpDown' - This is a special DM written expecially for the Pac Bell Texpo demo.  It }
{ Scales the position of a head/hand pair either up or down.  The first input is the control and scale }
{ Factor.  If it is positive scale up by this much.  If neg scale down.  If zero don't do anything. }
{ Input #2 is assumed to be the polhmoffset point, #3 is the head and #4 is the floor. }

 const
  WaitFor = 120;
 type
  UpScaleRec = record
     polhmp, headp, floorp: PRecPtr;
     when: LongInt;
   end;
  UpScalePtr = ^UpScaleRec;

 procedure doSpecialScale;
  var
   p: UpScalePtr;
   oldHead: Point3d;
   factor, elevation, scale: integer;
 begin
  factor := dm.SlotsIn[0].ptrfrm^.i;
  if factor = 0 then
   exit(doSpecialScale);
  p := UpScalePtr(dm.private);
  if p = nil then
   exit(doSpecialScale);
  if (p^.polhmp = nil) or (p^.headp = nil) or (p^.floorp = nil) then
   exit(doSpecialScale);
  if p^.when + WaitFor > Ticks^ then
   exit(doSpecialScale);

  with p^ do
   begin
    oldHead := headp^.lSix.pt;
```

```
      if false then
        AnnounceB(StringOf('Scaling by ', factor : 1, '.  start x = ', polhmp^.ISix.pt.x : 1, ' y = ',
       polhmp^.ISix.pt.y : 1));
      elevation := floorp^.ISix.pt.y - headp^.ISix.pt.y;
      elevation := factor;

      scale := polhmp^.ISix.tt.yaw;
      polhmp^.ISix.tt.yaw := DegRange(scale + factor);
      polhmp^.ISix.tt.pitch := DegRange(-(scale + factor));
      when := Ticks^;
      call(DataMassageAddr);
      with polhmp^.ISix.pt do
        begin
          x := x + (headp^.ISix.pt.x - oldHead.x);
          y := y + (headp^.ISix.pt.y - oldHead.y) + elevation;
          z := z + (headp^.ISix.pt.z - oldHead.z);
          if false then
            Announce(StringOf('  end x = ', x : 1, ' y = ', y : 1));
        end;
      when := Ticks^;
    end;
  end;

{ After every input hookup, recalculate and cashe the inputs points addr in }
{ the dm's private words. }
  procedure HandleSpecialScale; { (v : DMVerb; var dm : DMRec) }
    var
      i: integer;
      p: UpScalePtr;
      h: Handle;
    procedure CacheHookup;
      var
        i: integer;
        p: UpScalePtr;
    begin
      p := UpScalePtr(dm.private);
      with p^ do
        begin
          polhmp := nil;
          headp := nil;
          floorp := nil;
          if dm.SlotsIn[1].kind = frmTree then
            polhmp := FindTreeName(mainTreePtr, dm.SlotsIn[1].name);
          if dm.SlotsIn[2].kind = frmTree then
            headp := FindTreeName(mainTreePtr, dm.SlotsIn[2].name);
          if dm.SlotsIn[3].kind = frmTree then
            floorp := FindTreeName(mainTreePtr, dm.SlotsIn[3].name);
          if (polhmp = nil) or (headp = nil) or (floorp = nil) then
            begin
              Announce(StringOf('Input #2-4 must be from a tree for DM ', dm.name, '.'));
              when := Ticks^;
            end;
        end;
```

```
  end;


begin
  case v of
    initDM:             { Called once the first time this DM is started. }
      begin
        if dm.private <> nil then
          doClose(dm);
        h := NewHandle(sizeof(UpScaleRec));
        if h <> nil then
          begin
            MoveHHi(h);
            HLock(h);
            dm.private := h^;
            p := UpScalePtr(dm.private);
            with p^ do
              begin
                polhmp := nil;
                headp := nil;
                floorp := nil;
              end;
            CacheHookup;
          end
        else
          begin
            Announce('Not enough memory to open this HitTest DM');
            dm.state := usrOff;
          end;
      end;
    massageDM:          { Called once through the main loop. do a massage }
      begin
      end;
    reHookedDM:
      CacheHookup;
    fopenDM:            { This DM has just been read from a file. If it's state is }
                        { on it was hooked up properly. }
      CacheHookup;
    otherwise
      GenericHandle(v, dm);
  end;      { case }
end;        { HandleSpecialScale }

{-------------------------------------------------------------}
{ InPointList dm. }
{ 1-6 inputs, all pointD's, 1 output, a pointListD. }
{ This just takes all the inputs and makes a nil terminated array of }
{ addresses to the points. A pointer to the list is put into PointsOut[0].LastValue. }

  procedure doInPointList (var dm: DMRec);
    { The massage for this DM does nothing. }
  begin
  end;
```

```
procedure HandleInPointList (v: DMVerb; var dm: DMRec);
  const
    InPointSize = maxDMInput + 1;
  type      { The pointList array is one larger than the number of inputs }
    InPointListType = array[0..InPointSize] of PRecPtr;
    InPointListPtr = ^InPointListType;
  var
    h: Handle;

  procedure CacheHookup;
    var
      pp: InPointListPtr;
      i: integer;
  begin
    pp := InPointListPtr(dm.private);
    for i := 0 to InPointSize - 1 do
      pp^[i] := PRecPtr(dm.SlotsIn[i].ptrfrm);
    pp^[InPointSize] := nil;
    dm.PointsOut[0].LastValue.p := Pointer(pp);
  end;

begin
  case v of
    initDM:             { Called once the first time this DM is started. }
      begin
        if dm.private <> nil then
          doClose(dm);
        h := NewHandle(sizeof(InPointListType));
        if h <> nil then
          begin
            MoveHHi(h);
            HLock(h);
            dm.private := StripAddress(h^);
            CacheHookup;
          end
        else
          begin
            Announce('Not enough memory to open this InPointList DM');
            dm.state := usrOff;
          end;
      end;
    reHookedDM:
      CacheHookup;
    fopenDM:            { This DM has just been read from a file.  If it's state is }
                        { on it was hooked up properly. }
      CacheHookup;
    otherwise
      GenericHandle(v, dm);
  end;      { case }
end;

{-------------------------------------------------------------}
```

```
{ Polhemus dm. }
{ 1 integer input, 1 point output. }
{ This DM moves the output point assuming the single input is the first in an }
{ array of integers which is the rawdataArray for a polhemus. It moves the }
{ point around assuming these are raw polhemus inputs. }
{ This DM is the same as the collection of DM's in RB1a.DM. It is just here to simplify }
{ head/hand hookups. }


  procedure doPolhemusDM (var dm: DMRec);
   const
    rotScale = $011FF;        { Fixed value for 0.07030 }
   var
    intsPtr: SixPtrType;
    transScale: integer;
  begin
   intsPtr := SixPtrType(dm.SlotsIn[0].ptrfrm);
   transScale := dm.privateWords[0];
   with dm.PointsOut[0] do
    if ptrto <> nil then
     begin
      with ptrto^.lSix.pt do
       begin
        z := intsPtr^.s[0] div (-transScale);
        x := intsPtr^.s[1] div transScale;
        y := intsPtr^.s[2] div (-transScale);
       end;
      with ptrto^.lSix.tt do
       if dm.privateWords[1] <> 0 then
        begin  { rotation for the head. }
         yaw := fRound(FixMul(hLong(intsPtr^.s[3]), rotScale));
         pitch := fRound(FixMul(hLong(intsPtr^.s[4]), rotScale)) + 1800;
         roll := fRound(FixMul(hLong(intsPtr^.s[5]), rotScale));
        end
       else
        begin                        { rotation for the hand. }
         yaw := fRound(FixMul(hLong(intsPtr^.s[3]), rotScale)) + 1800;
         pitch := fRound(FixMul(hLong(intsPtr^.s[4]), -rotScale)) + 1800;
         roll := fRound(FixMul(hLong(intsPtr^.s[5]), -rotScale));
        end;
      ConstrainPt(ptrto);
     end;
  end;

  procedure HandlePolhemusDM (v: DMVerb; var dm: DMRec);
   procedure UserCalib;
    var
     str, str2, prompt: Str255;
   begin
    prompt := concat('Polhemus DM: ', dm.name, chr(13), 'Translational scale?');
    str := StringOf(dm.PrivateWords[0] : 1);
    str2 := StringOf(dm.PrivateWords[1] : 1);
    if GetStrings(prompt, 'Head(1) or hand(0)?', str, str2) then
```

-000514

```
    begin
      dm.privateWords[0] := StringtoInt(str);
      dm.privateWords[1] := StringtoInt(str2);
      If dm.privateWords[1] <> 0 then
        dm.privateWords[1] := 1;
    end;
  end;
begin
  case v of
    initDM:            { Called once the first time this DM is started. }
      begin
        if dm.private <> nil then
          doClose(dm);
        dm.PrivateWords[0] := 60;
        dm.privateWords[1] := 1;
        UserCalib;
      end;
    calibDM:           { Calibrate the DM module. }
      UserCalib;
    CalibPartDM:
      begin
        dm.privateWords[0] := DMverbMod;
      end;
    describeDM:        { put a description into describeStr }
      begin
        describeStr := StringOf('TransScale = ', dm.privateWords[0] : 1, '.');
      end;
    otherwise
      GenericHandle(v, dm);
  end;     { case }
end;       { HandlePolhemusDM }

{-------------------------------------------------------------}
{ WatchPt dm. }
{ 1 point input, 1 point output. }
{ This DM changes the attitudes of the output point so one of it's axis always is }
{ pointing directly at the input point. In calibration you can specify whether the }
{ axis to use is x, y, z. You can also negate the sign to look down the axis in the opposite direction. }


{$Setc FastAngle = true }

  function doAngleProc (sine, cos: Fixed): LongInt;
  begin
    If (sine = 0) and (cos = 0) then
      doAngleProc := 0
    else
      doAngleProc := AngleProc(sine, cos, CSTBHandle^);
  end;

  procedure calcLookAt (look, at: PRecPtr; which: WhichAxis; neg: Boolean);

    var
```

```
    temp: PointRec;
    pt: Point3d;
    tempRot: RotTrip;
    Hype: real;
    f: Fixed;

  procedure CalcYaw (offset: integer);
  begin          { Calc Yaw }
    temp.gPt := at^.gPt;
    Unconvert(@temp);
    if neg then
      with temp.lSix.pt do
        begin
          x := -x;
          y := -y;
          z := -z;
        end;
    with tempRot, temp.lSix.pt do
      begin
{$ifc FastAngle }
        yaw := doAngleProc(z, x) - 900;
{$elsec }
        Hype := sqrt(longInt(x) * x + longInt(z) * z);
        yaw := Ang_arccos(z / Hype);
        if x > 0 then
          yaw := 3600 - yaw;
{$endc }
        SetSixth(look, 3, yaw + offset);
      end;
  end;
  procedure CalcPitch (offset: integer);
  begin
    temp.gPt := at^.gPt;
    Unconvert(@temp);
        { Calc pitch.  Zero's y. }
    if neg then
      with tempRot, temp.lSix.pt do
        begin
          x := -x;
          y := -y;
          z := -z;
        end;
    with tempRot, temp.lSix.pt do
      begin
{$ifc FastAngle }
        pitch := doAngleProc(z, y) - 900;
{$elsec }
        Hype := sqrt(longInt(y) * y + longInt(z) * z);
        pitch := Ang_arccos(z / Hype);
        if y > 0 then
          pitch := 3600 - pitch;
{$endc }
        SetSixth(look, 4, pitch + offset);
```

```
      end;
    end;

  begin
    DirtyConvert(at);
    temp.up := look;
    temp.right := nil;
    temp.down := nil;
    with look^.lSix.tt do
      begin
        roll := 0;
        pitch := 0;
        yaw := 0;
      end;
    case which of
      doZ:
        begin
          CalcYaw(0);
          CalcPitch(0);
        end;
      doY:
        begin
          CalcYaw(0);
          CalcPitch(900);
        end;
      doX:
        begin
          CalcYaw(900);
                { Calc roll }
          temp.gPt := at^.gPt;
          Unconvert(@temp);
          if neg then
            with temp.lSix.pt do
              begin
                x := -x;
                y := -y;
                z := -z;
              end;
          with tempRot, temp.lSix.pt do
            begin
{$ifc FastAngle }
              roll := doAngleProc(y, x);
{$elsec }
              Hype := sqrt(longInt(y) * y + longInt(x) * x);
              roll := Ang_arccos(x / Hype);
              if y < 0 then
                roll := 3600 - roll;
{$endc }
              SetSixth(look, 5, roll);
            end;
        end
    end;
  end;    { calcLookAt }
```

-000517

```
procedure doWatchPt (var dm: DMRec);

  var
    inP, moveP: PRecPtr;
    which: WhichAxis;
    neg: Boolean;

begin
  if dm.slotsIn[1].ptrfrm^.i <> 0 then
    begin   {input 2 is conditional}

      inP  := PRecPtr(dm.SlotsIn[0].ptrfrm);
      moveP  := dm.PointsOut[0].ptrto;
      if moveP = nil then
        exit(doWatchPt);

      which  := WhichAxis(dm.PrivateWords[0]);
      neg  := Boolean(dm.PrivateWords[1]);

      calcLookAt(moveP, inP, which, neg);
      exit(doWatchPt);

    end;  {if true}
end;

procedure HandleWatchPt (v: DMVerb; var dm: DMRec);
  procedure UserCalib;
    const
      watchPointID = 2040;
      xItem = 5;
      yItem = 6;
      zItem = 7;
      posAxis = 8;
      negAxis = 9;
    var
      watchDialog: dialogPtr;
      tmp1, tmp2, itemHit: integer;
      savePort: grafPtr;

  begin
    getPort(savePort);
    watchDialog := GetNewDialog(watchPointID, nil, pointer(-1));
    PositionWindow(watchDialog, 50, 50);
    setPort(watchDialog);
    tmp1  := dm.PrivateWords[0];
    tmp2  := dm.PrivateWords[1];
    RadioRange(watchDialog, xItem, 3, tmp1);
    RadioRange(watchDialog, posAxis, 2, tmp2);

    showWindow(watchDialog);
    paramText(dm.Name, '', '', '');
    repeat
```

```
      modalDialog(nil, itemHit);
      case itemHit of
        xItem, yItem, zItem:
          begin
            tmp1 := itemHit - xItem;
            RadioRange(watchDialog, xItem, 3, tmp1);
          end;
        posAxis, negAxis:
          begin
            tmp2 := itemHit - posAxis;
            RadioRange(watchDialog, posAxis, 2, tmp2);
          end;
        otherwise
          ;
      end;
    until itemHit <= 2;
    if (itemHit = 1) then
      begin
        dm.PrivateWords[0] := tmp1;
        dm.PrivateWords[1] := tmp2;
      end;
    disposDialog(watchDialog);
    setPort(savePort);
  end;

begin
  case v of
    initDM:          { Called once the first time this DM is started. }
      begin
        if dm.private <> nil then
          doClose(dm);
        dm.PrivateWords[0] := ord(doX);
        dm.PrivateWords[1] := ord(false);
        UserCalib;
      end;
    calibDM:         { Calibrate the DM module. }
      UserCalib;
    CalibPartDM:
      begin
        dm.privateWords[0] := DMverbMod;
      end;
    describeDM:      { put a description into describeStr }
      begin
        describeStr := StringOf('WatchPt.  axis = ', dm.privateWords[0] : 1, '.');
      end;
    otherwise
      GenericHandle(v, dm);
  end;      { case }
end;        { HandleWatchPt }

end.
```

```
{ Handles input of raw data from one GBII box hooked up to a serial port. }

unit PolDAmod;

interface
  uses
    Globals, ChuckStuff, serialTypes, serialRoutines, RawUnit, PolIO;

  function PolDA (polhm: polhmSerPtr; v: DAverb): integer;

implementation


  function PolDA;

    var
      i, j, res, state, poller: integer;
      prefix: string;

  begin
    case v of
      initDA:
        begin
          if numPolhms = 2 then
            prefix := ''
          else
            prefix := StringOf(numPolhms - 1 : 1, ' ');

          with polhm^.serBlock.dar do
            begin
              name := 'Pol';
              size := 6 * polhm^.ssPairs;
              FirstSlot := AllocateRaw(name, size);
              if FirstSlot <> -1 then
                begin
                  ptrto := @RawData[FirstSlot];
                  for i := 1 to polhm^.ssPairs do
                    begin
                      j := FirstSlot + (i - 1) * 6;
                      rawDataDef[j].name := StringOf(prefix, i : 1, ' ', 'z');
                      rawDataDef[j + 1].name := StringOf(prefix, i : 1, ' ', 'x');
                      rawDataDef[j + 2].name := StringOf(prefix, i : 1, ' ', 'y');
                      rawDataDef[j + 3].name := StringOf(prefix, i : 1, ' ', 'asm');
                      rawDataDef[j + 4].name := StringOf(prefix, i : 1, ' ', 'ele');
                      rawDataDef[j + 5].name := StringOf(prefix, i : 1, ' ', 'roll');
                    end;
                  PolDA := testSuccess;
                end
              else
                PolDA := testFailed;
            end;
        end;
```

```
   readDA:
     begin
       poller := GetPol(polhm);
       if poller = -1 then
         PolDA := -1
       else
         begin
           with polhm^.serBlock.dar do
             begin
               BlockMove(pointer(ord4(@polhm^.raw)), Ptr(ptrto), polhm^.readSize);
             end;
           PolDA := 0;
         end;
     end;
   resetDA:
     begin
       ResetPol(polhm);
       PolDA := 0;
     end;
   otherwise
     PolDA := -1;
  end;
 end;
end.
```

04/15/90 10:15 Polhm_IO.pas Page 1

```
{ completely re-vamped version of PollIO.  Fixed by Scott Burgess April, 1989 }
{ the basic improvement is the incorporation of a means of handling multiple }
{ polhemus sensors.  Basically, this is accomplished by passing a serBlock}
{ var to each of the routines, which is modified, instead of the single global}
{ variables previously used.}


unit PolIO;

interface
  uses
    Serial, CompileTime, ChuckStuff, AutoLib, FastStuff, Globals, MiscRoutines, serialTypes,
        serialRoutines;

  const

    blab = false;
    pFastWait = 200;

{POLHEMUS command constants}
    pSendRecord = 'P';
{ configure:  f = Binary, c = non-continuous, u = centimeters units, 0 = output list: 2=cartisian,4=elevation.
       }
    pConfigure = 'fcuO2,4';       {+CR}
    pContinuous = 'C';
    pReset = 'R1';                        {+CR}
    pStations = 'l';                  {+CR}
    pHemisphere = 'H7,0,0,-1';        {+CR    not used}
    CR = chr(13);

  procedure ResetPolhemusBuffers;

  function GetPol (polhm: polhmSerPtr): integer;
  procedure SendPolFigInfo (polhm: polhmSerPtr);
  procedure ResetPol (polhm: polhmSerPtr);
  function TestForPol (Portnum: integer; polhm: polhmSerPtr): Boolean;
  function PolIsAnybodyOutThere (polhm: polhmSerPtr): Boolean;


implementation


  {This Function Tests to see if a Polhemus is }
  {alive and well on either serial port. }

  function TestForPol; {(Portnum : integer; polhm:polhmSerPtr) : Boolean;}

    var
      i, j, k, n, p, runerr, q, err4: Integer;
      abort, good: boolean;
      str:  str255;
      port: sPortSel;
      l: longint;
```

-000522

```
begin
  TestforPol := false;

  q := 1;
  while q <= 80 do
    begin
      polhm^.inChars[q] := '0';
      q := q + 1;
    end;

  setUpPort(portNum, polhm^.serBlock);

  setUpSerialRec(polhm^.SerBlock);

  if (openADriver(polhmBaudR, 'Polhemus', polhm^.SerBlock, false)) then
    good := PolIsAnybodyOutThere(polhm)

  else
    begin
      good := false;
    end;
  if good then
    TestForPol := true
  else
    begin
      testForPol := false;
      {announce('resetting the serial buffer');}
    end;
end;

procedure ResetPolhemusBuffers;
  var
    count, error: integer;
begin
  for count := 1 to numPolhms do
    if polhms[count]^.whatAmI = Space3 then
      error := SerSetBuf(polhms[count]^.serBlock.serialIn.ioRefNum, @polhms[count]^.inSerBuff, 0);
end;


{The following procedure copies the polhemus input buffer into }
 procedure RemovePolLeadBytes (polhm: polhmSerPtr);
   var
     i, j, k, q: integer;
     copy: boolean;
 begin
   i := 1;
   j := 1;
   k := 1;
   q := 0;
   while j <= polhm^.recordSize do {While the input buffer still has sand}
     begin
```

```
      if (k > 0) and (k < 4) then    {bytes 1..3 are status bytes - don't copy}
        copy := false
      else
        copy := true;
      if k = 15 then  {count through the size of an individual record}
        k := 0;
      k := k + 1;
      if copy = true then {copy the byte, swapping byte order}
        begin
          if q <> 1 then {do the first 1/2 of swap and toggle swap phase indicator}
            begin
              polhm^.raw[i] := polhm^.inChars[j + 1];
              q := 1;
            end
          else                    { move the low byte into the first recieving position...}
            begin
              polhm^.raw[i] := polhm^.inChars[j - 1];
              q := 0;                              {and toggle to MSB swap}
            end;
          i := i + 1;  {advance receiving array only if there is a byte to transfer}
        end;
      j := j + 1;      {always advance sending array}
    end;
  end;


{this procedure determines the following:  is the polhemus a 3Space or Isotrak }
{                                            how many records will it send}
{to do it, it sends an 'l'  (stations) command, in response to which a 3Space}
{sends back a record identifying which sensors are active.  The Isotrak doesn't}
{have this command, so it sends back an error (21*ERROR) message.  }
  procedure identifyPolhemus (theP: polhmSerPtr);
    var
      x, pairs, runErr: integer;
      l: longint;
      restoreBytes: string;
  begin
    restoreBytes := theP^.sendBytes;
    pairs := 0;
    theP^.sendBytes := concat(pStations, CR);

    ClearInBuff(theP^.serBlock.serialIn);

    runerr := writeOut(theP^.serBlock, theP^.sendBytes, false, SlowWait);

    { This while loop will hang forever if not more than 13 characters come in!    Chuck }
    l := 0;
    while l < 13 do
      runerr := SerGetBuf(theP^.serBlock.SerialIn.ioFRefNum, l);

    runerr := readln(theP^.serBlock, @theP^.inChars, 13, false);

    if (theP^.inChars[4] = 'E') and (theP^.inChars[5] = 'R') then
```

```
    begin
        {it's an Isotrak, because it doesn't have stations}
      theP^.whatAmI := isotrak;
      theP^.ssPairs := 1;
    end
  else
    begin
      {it's a 3Space }
      theP^.whatAmI := Space3;
      for x := 4 to 11 do      {4..11 to avoid the 3 byte header.  Then 8 '0's or '1's}
        if theP^.inChars[x] = '1' then
          pairs := pairs + 1;
      theP^.ssPairs := pairs;
    end;
  theP^.recordSize := theP^.ssPairs * 15;
  theP^.readSize := theP^.ssPairs * 12;
  theP^.serBlock.readCount := theP^.recordSize;

  theP^.sendBytes := restoreBytes;
end;


{The following procedure tests the open line for a Polhemus. If it is there }
{then PollsAnybodyOutThere sends a reset to the Box and gives TestForPol a 0.}

 function PollsAnybodyOutThere (polhm: polhmSerPtr): boolean;

  var
    runerr, i, j: integer;
    l, q: longint;
    str: string;
    errString, nameStr: str255;
    kindStr: string;
    timeout: boolean;
 begin
  PollsAnybodyOutThere := false;
  j := 0;
  polhm^.sendBytes := pSendRecord;

  while (j <= 1) do
    begin
      ClearInBuff(polhm^.serBlock.serialIn);

      runerr := writeOut(polhm^.serBlock, polhm^.sendBytes, false, SlowWait);

      if (runerr <> noerr) and blab then
        Announce(StringOf('PollsAnybodyOutThere: write error # ', runerr : 1));
      q := Ticks^;
      l := 0;
      timeout := false;
      while (l < 5) and not timeout do
        begin
          runerr := SerGetBuf(polhm^.serBlock.SerialIn.ioFRefNum, l);
```

```
        if (Ticks^ >= q + 120) then    { it's been too long, get out of this loop }
          begin                         { and report the error to The Guy}
            {realPortNames(polhm^.myPort,  errString);}
            {AnnounceB(StringOf('The Polhemus has not responded on the ', errString));}
            timeout := true;
          end;
      end;
    if not timeout then
      begin

        runerr := readln(polhm^.serBlock, @polhm^.inChars, 5, false);

        if (runerr <> noerr) and blab then
          Announce(StringOf('PollsAnybodyOutThere: Read error # ', runerr : 1));
        if ((polhm^.inChars[1] = '0') or (polhm^.inChars[1] = 'U')) and ((polhm^.inChars[2] >= '1') and
    (polhm^.inChars[2] <= '8')) then
          begin
            PollsAnybodyOutThere := true;

            identifyPolhemus(polhm);

            polhm^.myPort := currentPortNum;
            nameStr := UserPortName(polhm^.myPort);
            case polhm^.whatAmI of
              isotrak:
                kindStr := 'Polhemus Isotrak';
              Space3:
                begin
{set the buffer size to 100 for 3spaces because they can have large record sizes}
                  runerr := SerSetBuf(polhm^.serBlock.serialIn.ioRefNum, @polhm^.inSerBuff, 100);
                  kindStr := 'Polhemus 3Space';
                end;
            end;
{$ifc Debug }
            AliveAndWell(kindStr, nameStr);
{$elsec }
            Announce(stringof(kindStr, ' alive and well on the ', nameStr));
 {$endc }
            ResetPol(polhm);
            j := 10;
          end
        else
          begin
            if blab then
              begin
                str := '';
                for i := 1 to l do
                  str := concat(str, polhm^.inChars[i]);
                Announce(concat('Polhemus read got ', str));
              end;     { if not timeout. }
          end;
      end;
```

```
      j := j + 1;
    end;
  polhm^.sendBytes := pSendRecord;
end;


procedure SendPolFigInfo (polhm: polhmSerPtr);
  var
    runerr: integer;
    polSend: str255;
begin
  runerr := 0;

  polSend := concat(pConfigure, CR);

  if true then
    polSend := concat(PolSend, pHemisphere, CR);

  runerr := writeOut(polhm^.serBlock, PolSend, false, SlowWait);

  ClearInBuff(polhm^.serBlock.SerialIn);
end;


procedure ResetPol (polhm: polhmSerPtr);
  var
    runerr: integer;
    l: longint;
begin
{   ClearInBuff(polhm^.serBlock.SerialIn);  }
  runerr := 0;
  polhm^.sendBytes := concat(pReset, CR);

  runerr := writeOut(polhm^.serBlock, polhm^.sendBytes, false, SlowWait);

  runerr := SerGetBuf(polhm^.serBlock.SerialIn.ioFRefNum, l);
  if (l <> 0) then
    runerr := readIn(polhm^.serBlock, ptr(@polhm^.inChars), l, false);

  ClearInBuff(polhm^.serBlock.SerialIn);
  SendPolFigInfo(polhm);
  runerr := SerGetBuf(polhm^.serBlock.SerialIn.ioFRefNum, l);
  if (l <> 0) then
    runerr := readIn(polhm^.serBlock, ptr(@polhm^.inChars), l, false);


  if pOneShot then
    begin
      polhm^.serBlock.SerialIn.ioCompletion := nil;
      polhm^.sendBytes := pSendRecord;
      runerr := writeOut(polhm^.serBlock, polhm^.sendBytes, false, SlowWait);
      polhm^.lastResponse := Ticks^;
    end
```

-C00527

```
  else
    begin
      { If not pOneShot the prime the read cycle by telling the polhemus to send continous. }
      polhm^.serBlock.rFlag := 0;
      polhm^.serBlock.SerialIn.ioCompletion := @ReadCompletion;
      polhm^.serBlock.GlobBuff := @polhm^.inChars;
      runerr := writeOut(polhm^.serBlock, pContinuous, false, SlowWait);
      polhm^.lastResponse := Ticks^;
      { If not pOneShot the prime the read cycle by issuing the first async read. }
      with polhm^ do
        runerr := readIn(serBlock, @serBlock.interruptBuff, serBlock.readCount, true);
    end;

end;


function OneShotGetPol (polhm: polhmSerPtr): integer;
  var
    idx, runerr, i: integer;
    len: longint;
    portName: str255;
    serSta: serStaRec;
    x: integer;
begin
  OneShotGetPol := 0;
  idx := 1;
  runerr := 0;
  if polhm^.lastResponse + 0 > Ticks^ then
    exit(OneShotGetPol);

  runerr := SerGetBuf(polhm^.serBlock.SerialIn.ioFRefNum, len);

  if len >= polhm^.recordSize then
    begin
      runerr := readIn(polhm^.serBlock, ptr(@polhm^.inChars), polhm^.recordSize, false);

      if len > polhm^.recordSize then
        Announce(StringOf('OneShotGetPol: ', len : 1, ' chars in buffer, ', polhm^.recordSize : 1, '
       expected.'));
      RemovePolLeadBytes(polhm);

      runerr := writeOut(polhm^.serBlock, polhm^.sendBytes, true, pFastWait);

      runerr := SerStatus(polhm^.serBlock.serialIn.ioRefNum, serSta);
      if serSta.cumErrs <> 0 then
        begin
        end;

      polhm^.lastResponse := Ticks^;
    end
  else   { if (len< polhm^.recordSize-1) then}
    begin
      if (Ticks^ > polhm^.lastResponse + 180) then
```

```
        begin
          runerr := readln(polhm^.serBlock, ptr(@polhm^.inChars), len, false);
          portName := UserPortName(polhm^.myPort);
          AnnounceB(stringof('The Polhemus on ', portName, ' has timed out.'));
          Announce('Try resetting to establish communications . ');
          announce('');
          OneShotGetPol := -1;
        end
      end;
  end; { OneShotGetPol }

  function ContinuousGetPol (polhm: polhmSerPtr): integer;
    var
      idx, runerr, i: integer;
      len: longint;
      portName: str255;
      serSta: serStaRec;
      x: integer;
  begin
    ContinuousGetPol := 0;
    idx := 1;
    runerr := 0;
    if polhm^.lastResponse + 0 > Ticks^ then
      exit(ContinuousGetPol);

    if polhm^.SerBlock.rFlag <> 0 then
    . begin

        RemovePolLeadBytes(polhm);
        polhm^.lastResponse := Ticks^;
        polhm^.serBlock.rFlag := 0;      { Clear flag that say's we got a new buffer }
      end
    else if (Ticks^ > polhm^.lastResponse + 180) then
      begin
        portName := UserPortName(polhm^.myPort);
        AnnounceB(stringof('The Polhemus on ', portName, ' has timed out.'));
        Announce('Try resetting to establish communications . ');
        announce('');
        ContinuousGetPol := -1;
      end
  end; { ContinuousGetPol }

  function GetPol (polhm: polhmSerPtr): integer;
  begin
    if pOneShot then
      GetPol := OneShotGetPol(polhm)
    else
      GetPol := ContinuousGetPol(polhm);
  end;

end.
```

```
unit ScottsDMs;
interface
  uses
    SANE, FixMath, ChuckStuff, AutoLib, FastStuff, Globals, Tree3DGlob, {}
    MiscRoutines, DataFlash, Tree3D, formTree3D, DMTypes, DMGlobals;

  procedure doRandom (var dm: DMRec);                {output1= num in range
        privatewords[1]..[1]+[2]  }
  procedure HandleRandom (v: DMVerb; var dm: DMRec);

  procedure doAbsolute (var dm: DMRec);              {output1=abs(input1)}
  procedure doSquare (var dm: DMRec);                {output1 = input1^2}
  procedure doSqrRoot (var dm: DMRec);               {output1 = sqr(input12) }

  procedure doCube (var dm: DMRec);                  {output1=input1^3}
  procedure doModulo (var dm: DMRec);                    {output1=input1 mod input2}
  procedure doExponential (var dm: DMRec);               {output1 = exp ( input1 ) }
  procedure doNegation (var dm: DMRec);              {output1 = -(input1) }
  procedure doPolynomial (var dm: DMRec);          {see below}
  procedure doRound (var dm: DMRec);                     {rounds in1 to the nearest in2}
  procedure doSort2Values (var dm: dmRec);
  procedure doSpeed (var dm: DMRec);               {see description below}


implementation

  procedure doRandom;
{ This procedure returns a random value between the base and the base + variation }
{ inclusive.  base and variation are in privatewords as set by HandleRandom. }
{ base and variation are stored in the DM's privatewords 1 and 2.  They are presented to }
{ the user as min and max range inclusive. }

    var
      baseValue, maxVariation, actualVariation: integer;
  begin
    baseValue := dm.privateWords[1];
    maxVariation := dm.privateWords[2];
    with dm, dm.PointsOut[0] do
      begin
        LastValue.i := baseValue + (abs(Random) mod maxVariation);
        if ptrto <> nil then
          SetSixth(ptrto, ord(SixAxis), LastValue.i);
      end;
  end;

  procedure HandleRandom; { (v : DMVerb; var dm : DMRec) }
    var
      i, opcode: integer;
    procedure UserCalib;
      var
        str1, str2: Str255;
        l: longInt;
```

```
  begin
    str1 := StringOf(dm.privateWords[1] : 1);
    str2 := StringOf(dm.privateWords[1] + dm.privateWords[2] - 1 : 1);
    if GetStrings(StringOf('"', dm.name, '", returns a random number between'), 'and', str1, str2) then
      begin
        StringToNum(str1, l);
        dm.privateWords[1] := l;
        StringToNum(str2, l);
        dm.privateWords[2] := l - dm.privateWords[1] + 1;
      end;
  end;

begin
  case v of
    InitDM:
      begin
        if dm.private <> nil then
          doClose(dm);
        dm.privateWords[1] := 0;
        dm.privateWords[2] := 100;
        UserCalib;
      end;
    calibDM:
      UserCalib;
    otherwise
      GenericHandle(v, dm);
  end;
end;

procedure doAbsolute;
  var
    temp: integer;
begin
  temp := dm.SlotsIn[0].ptrfrm^.i;

  with dm, dm.PointsOut[0] do
    begin
      LastValue.i := abs(temp);
      if ptrto <> nil then
        SetSixth(ptrto, ord(SixAxis), LastValue.i);
    end;
end;

procedure doSquare;                {output1=input1^2}
  var
    temp: integer;
begin
  temp := dm.SlotsIn[0].ptrfrm^.i;

  with dm, dm.PointsOut[0] do
    begin
      LastValue.i := sqr(temp);
      if ptrto <> nil then
```

```
      SetSixth(ptrto, ord(SixAxis), LastValue.i);
    end;
end;

procedure doSqrRoot;                {output1= sqrt(input1) }
begin
  with dm.SlotsIn[0].ptrfrm^, dm.PointsOut[0] do
    begin
      case dm.SlotsIn[0].inType of
        intD:
          LastValue.i := round(sqrt(i));
        longD:
          LastValue.l := round(sqrt(l));
        fixedD:
          LastValue.f := X2Fix(sqrt(Fix2X(f)));
        realD:
          LastValue.r := sqrt(r);
      end;
      if ptrto <> nil then
        SetSixthType(ptrto, ord(SixAxis), LastValue, outType);
    end;
end;

procedure doCube;                {output1=input1^3}
  var
    temp: integer;
begin
  temp := dm.SlotsIn[0].ptrfrm^.i;
  with dm.PointsOut[0] do
    begin
      LastValue.i := temp * temp * temp;
      if ptrto <> nil then
        SetSixth(ptrto, ord(SixAxis), LastValue.i);
    end;
end;

procedure doModulo;
begin
  if dm.SlotsIn[1].ptrfrm^.i <> 0 then
    begin
      dm.PointsOut[0].LastValue.i := (dm.SlotsIn[0].ptrfrm^.i mod dm.SlotsIn[1].ptrfrm^.i);
      dm.PointsOut[1].LastValue.i := dm.SlotsIn[0].ptrfrm^.i - dm.PointsOut[0].LastValue.i;
    end
  else
    begin
      dm.PointsOut[0].LastValue.i := 0;
      dm.PointsOut[1].LastValue.i := 0;
    end;
end;

procedure doExponential;                {output1=e^input1}
  var
    temp: integer;
```

-000532

```
begin
  temp := dm.SlotsIn[0].ptrfrm^.i;
  with dm, dm.PointsOut[0] do
    begin
      LastValue.i := round(exp(temp));
      if ptrto <> nil then
        SetSixth(ptrto, ord(SixAxis), LastValue.i);
    end;
end;


procedure doNegation;                  {output1=input1^2}
  var
    temp: integer;
begin
  temp := dm.SlotsIn[0].ptrfrm^.i;
  with dm, dm.PointsOut[0] do
    begin
      LastValue.i := -1 * (abs(temp));
      if ptrto <> nil then
        SetSixth(ptrto, ord(SixAxis), LastValue.i);
    end;
end;

procedure doPolynomial;
{this does this formula:}
  {output0=a+bx+cx^2+dx^3+ex^4 }

  var
    i: integer;
    ins: array[0..4] of real;
    lastMult: real;
    scalar, tempLast: real;
begin
  with dm.SlotsIn[5] do
    case inType of
      intD:
        scalar := ptrfrm^.i;
      longD:
        scalar := ptrfrm^.l;
      realD:
        scalar := ptrfrm^.r;
    end;
  for i := 0 to 4 do
    with dm.SlotsIn[i] do
      case inType of
        intD:
          ins[i] := ptrfrm^.i;
        longD:
          ins[i] := ptrfrm^.l;
        realD:
          ins[i] := ptrfrm^.r;
```

```
      end;
    lastMult := scalar;
    tempLast := ins[0];
    for i := 1 to 4 do
      begin
        tempLast := tempLast + (ins[i] * lastMult);
        lastMult := lastMult * scalar;
      end;
    with dm, dm.PointsOut[0] do
      begin
        LastValue.i := round(tempLast);
        if ptrto <> nil then
          SetSixth(ptrto, ord(SixAxis), LastValue.i);
      end;
  end;

  procedure doRound;
{rounds input1 to the nearest multiple of input 2}
    var
      multiples, x, y: integer;
  begin
    x := dm.SlotsIn[0].ptrfrm^.i;
    y := dm.SlotsIn[1].ptrfrm^.i;

    with dm, dm.PointsOut[0] do
      begin
        LastValue.i := ((round(x / y)) * y);
        if ptrto <> nil then
          SetSixth(ptrto, ord(SixAxis), LastValue.i);
      end;
  end;


{ returns the higher value in output 1 and the lower value in output2}
  procedure doSort2Values; {var dm:dmRec}
    var
      in1, in2: integer;
  begin
    with dm do
      begin
        in1 := SlotsIn[0].ptrfrm^.i;
        in2 := SlotsIn[1].ptrfrm^.i;

        if in1 < in2 then
          begin
            PointsOut[0].LastValue.i := in2;
            PointsOut[1].LastValue.i := in1;
          end
        else
          begin
            PointsOut[0].LastValue.i := in1;
            PointsOut[1].LastValue.i := in2;
          end;
```

```
      with pointsOut[0] do
        if ptrto <> nil then
          SetSixth(ptrto, ord(SixAxis), LastValue.i);
      with pointsOut[1] do
        if ptrto <> nil then
          SetSixth(ptrto, ord(SixAxis), LastValue.i);
    end; {with dm}
  end;

  procedure doSpeed;
{ 2 inputs, 1 output. The output is speed (amount of change) of input #1 over the last input #2 times.}
{ Input #2 can be between 1 and 5. Over 5 = 5. }
    var
      memory, count: integer;
      runningTotal: integer;
      countedTotal: integer;
  begin
    memory := dm.SlotsIn[1].ptrfrm^.i;
    runningTotal := 0;
    countedTotal := 0;

    for count := 5 downto 1 do
      begin
        if count <= memory then
          countedTotal := countedTotal + (dm.privateWords[count - 1] - dm.privateWords[count]);
        dm.privateWords[count] := dm.privateWords[count - 1];
      end;
    dm.privateWords[0] := dm.SlotsIn[0].ptrfrm^.i;
    countedTotal := countedTotal + (dm.privateWords[0] - dm.privateWords[1]);

    with dm, dm.PointsOut[0] do
      begin
        LastValue.i := integer(round(countedTotal / memory));
        if ptrto <> nil then
          SetSixth(ptrto, ord(SixAxis), LastValue.i);
      end;
  end;


end.
```

```
{  Code to handle two types of DM's written for the Yashco delivery. }
{  One DM (RobotSlave) takes inputs and fills an array to send to the robots. }
{  The other DM (RobotMaster) writes the record out at an independant beat frequency. }
{  © 1988-1989 VPL Research Inc. }
{  12/28/88 Chuck Blanchard }

{ If LatchLeading is true then anytime an input for a leading byte is non-zero it is latched until }
{ a record is sent out or another non-zero value comes in. }
{$setc LatchLeading=1 }

unit RobotDMs;

interface

  uses
    Serial, ChuckStuff, AutoLib, FastStuff, Globals, Tree3DGlob, {}
    MiscRoutines, DMTypes, DMGlobals;

  procedure doRSlave (var dm: DMRec);
  procedure HandleRSlave (v: DMVerb; var dm: DMRec);

  procedure doRMaster (var dm: DMRec);
  procedure HandleRMaster (v: DMVerb; var dm: DMRec);

implementation

  const
    serBuffLen = 256;
    defaultBaud = baud19200 + stop10 + noParity + data8;
    defaultInterval = 6;
    IntervalIdx = 0;        { Index into privateWords for Ticks^ interval. }
    BaudIdx = 1;            { Index into privateWords for baud word. }
    DisplayIdx = 2;         { Index into privateWords for Display Values boolean. }

    MasterDlogID = 2021;    { Dialog box for Robot Master calibration. }
    DisplayItem = 8;        { Item # for Display Values check box. }

    SlaveDlogID = 2020;     { Dialog box for Robot Slave calibration. }

    LeadByteNum = 5;        { Number of leading bytes -1  (0..Num) }
    PosIntNum = 11;         { Number of position integers -1  (0..Num) }
    SpeedByteNum = 11;      { Number of speed bytes -1  (0..Num) }


    posIndex = LeadByteNum + 1;                  { start index for the position array }
    speedIndex = LeadByteNum + PosIntNum + 2;    { start index for the speed array }

  type

    SendRecordType = record
        LeadChars: packed array[0..LeadByteNum] of byte;     { 0..5 }
        pos: array[0..PosIntNum] of integer;                 { 6..17 }
```

```
      speed: packed array[0..SpeedByteNum] of byte;          { 18..29 }
    end;

  var
    SendRec, defaultSendRec: SendRecordType;           { Record to send. }

    toMasterFname,                  { File name to use to open the Master out port. }
    frmMasterFname: string[6]; { File name to use to open the Master in port. }
    toMasterRef,                 { file RefNum for the Master ouput channel. }
    frmMasterRef:  integer;      { file RefNum for the Master input channel. }

    serOutBuff: packed array[0..serBuffLen] of char;
    serInBuff: packed array[0..serBuffLen] of char;
    toMasterPB: ParamBlockRec;
    MasterOn: boolean;
    LastTick: LongInt;
    masterStatus: SerStaRec;
    displayValues: boolean;

{ Fill the sendrec with default values. }
  procedure SetDefault;
    var
      i: integer;
  begin
    with SendRec do
      begin
        for i := 0 to LeadByteNum do
          LeadChars[i] := 0;
        for i := 0 to PosIntNum do
          pos[i] := 0;
        for i := 0 to SpeedByteNum do
          speed[i] := 0;
        LeadChars[0] := $FF;
      end;
    defaultSendRec := SendRec;
  end;

{ Stuff the given value into the correct place in the send record. }
{ If it falls in a byte slot the just use the lower 8 bits. }
  procedure StuffValue (index, value: integer);
  begin
    with SendRec do
      if index < posIndex then
        begin
{$ifc LatchLeading }
          if value <> 0 then
            LeadChars[index] := BAND(value, $FF);
{$elsec }
          LeadChars[index] := BAND(value, $FF);
{$endc }
        end
      else if index < speedIndex then
        pos[index - posIndex] := value
```

```
    else
      speed[index - speedIndex] := BAND(value, $FF);
  end;

{-----------------------------------------}
  procedure doRSlave; { (var dm : DMRec) }
    var
      i: integer;
  begin
    for i := 0 to dm.inputs - 1 do
      with dm do
        if SlotsIn[i].ptrfrm <> nil then
          if privateWords[i] >= 0 then
            begin
              StuffValue(privateWords[i],  SlotsIn[i].ptrfrm^.i);
            end;
  end;

{ HandleRSlave has all the routines nessessary to pass data from the rawData array }
{ to a point in the tree after scaling and offseting them. }
  procedure HandleRSlave;   {•(v  :  DMVerb;•}
                            {•     var dm : DMRec);•}

    var
      i: integer;
      h: handle;

    procedure SetIndexes (var dm: DMRec);
      var
        i: integer;
    begin
      for i := 0 to dm.inputs - 1 do
        dm.privateWords[i]  :=  -1;
    end;

    procedure Calibrate (var dm: DMRec);
      var { calibrate this RSlave/Offset dm. }
        dlog: DialogPtr;
        str:  Str255;
        i, itemHit: integer;
        l: longInt;
    begin
      dlog := GetNewDialog(SlaveDlogID, nil, Pointer(-1));
      for i := 0 to 5 do
        begin
          SetEdText(dlog, i + 1, ntos(dm.privateWords[i]));
          if dm.SlotsIn[i].ptrfrm <> nil then
            str := SlotName(dm.SlotsIn[i])
          else
            str := concat('Input #', ntos(i));
          SetDlgText(dlog, statText, i + 2, str);
        end;
      repeat
```

```
      ModalDialog(nil, itemHit);
    until itemHit <= 2;  { Until OK or Cancel is clicked. }
    if itemHit = 1 then
      begin { OK clicked. }
        for i := 0 to 5 do
          begin
            GetEdText(dlog, i + 1, str);
            StringToNum(str, l);
            dm.privateWords[i] := l;
          end;
      end;
    DisposDialog(dlog);
  end;

begin
  case v of
    initDM:             { Called once the first time this DM is started. }
      begin
        MasterOn := false;
        SetDefault;
        SetIndexes(dm);
        Calibrate(dm);
      end;
    massageDM:          { Called once through the main loop.  do a massage }
      doRSlave(dm);
    closeDM:
      ;          { Called when this module is deleted.  Do whatever... }
    reHookedDM:
      ;       { DM has been re-hooked up. }
    fopenDM:            { This DM has just been read from a file.  If it's state is }
                          { on it was hooked up properly.  private points to the }
      begin             { private memory it had when saved. }
        ;
      end;
    fsaveDM:            { This DM is about to be saved to a file.  Do any changes }
      begin             { nessessary to private memory so it can be restored later. }
      end;
    calibDM:            { Calibrate the DM module. }
      begin
        Calibrate(dm);
      end;
    describeDM:         { put a description into describeStr }
      begin
        describeStr := StringOf('RSlave: ', dm.privateWords[BaudIdx] : 1, '.');
      end;
    writeCodeDM:
      ;
    otherwise           { Should be no other. }
      sysbeep(3);
  end;      { case }
end;        { HandleRSlave }
```

```
{-------------------------------------------}
procedure OpenMaster (var dm: DMRec);
  {  Open the Master for I/O using the global configuration parameters. }
  var
    i, err: integer;
    str: string;
    portCh: char;
    handshake: SerShk;
    configNum: integer;
 begin
   DisplayValues := Boolean(dm.privateWords[DisplayIdx]);
   MasterOn := false;
   if not false then
     Announce('OpenMaster: Port A not available.')
   else
     begin
       LastTick := 0;
       portCh := 'A';
       toMasterFname := concat('.', portCh, 'Out');
       frmMasterFname := concat('.', portCh, 'In');
       err := FSOpen(toMasterFname, 0, toMasterRef);
       if err = 0 then
         err := FSOpen(frmMasterFname, 0, frmMasterRef);
       if err = 0 then
         begin
           configNum := dm.privateWords[BaudIdx];
           err := SerReset(toMasterRef, configNum);
           err := SerReset(frmMasterRef, configNum);
           if false then
             begin
               err := SerSetBuf(toMasterRef, @serOutBuff, serBuffLen);
               err := SerSetBuf(frmMasterRef, @serInBuff, serBuffLen);
             end;
           if true then     { turn hardware handshaking off. }
             with handshake do
               begin
                 fCTS := 0;
                 fXOn := 0;
                 errs := parityErr + hwOverrunErr + framingErr;
                 evts := 0;
                 fInX := 0;
                 err := SerHShake(toMasterRef, handshake);
                 err := SerHShake(frmMasterRef, handshake);
               end;
           MasterOn := true;
           with toMasterPB do
             begin
               ioCompletion := nil;
               ioRefNum := toMasterRef;
               ioBuffer := @SendRec;
               ioNamePtr := @toMasterFname;
             end;
         end;
```

```
      if err <> 0 then
        begin
          MasterOn := false;
          str := StringOf('Master port open failed.  Error: ', err : 1, '.');
          Announce(str);
        end
    end;
end; { OpenMaster }

procedure CloseMaster;
  { Close the Master for I/O. }
  var
    err: integer;
begin
  if MasterOn then
    begin
      MasterOn := false;
      err := FSClose(toMasterRef);
      err := FSClose(frmMasterRef);
    end;
end; { CloseMaster }

procedure doDisplay;
  var
    i: integer;
    str: Str255;
begin
  str := '';
  with SendRec do
    begin
      for i := 0 to LeadByteNum do
        str := StringOf(str, LeadChars[i] : 4);
      for i := 0 to PosIntNum do
        str := StringOf(str, pos[i] : 6);
      for i := 0 to SpeedByteNum do
        str := StringOf(str, speed[i] : 4);
      Announce(str);
    end;
end;

procedure doRMaster; { (var dm : DMRec) }
  var
    err: integer;
    l: LongInt;
begin
  if dm.privateWords[IntervalIdx] + LastTick < Ticks^ then
    begin
      LastTick := Ticks^;
      l := sizeof(SendRecordType);
      toMasterPB.ioReqCount := sizeof(SendRec);
      err := PBWrite(@toMasterPB, true);
      if DisplayValues then
        doDisplay;
```

```
{$ifc LatchLeading }
      sendRec.LeadChars := defaultSendRec.LeadChars;
{$endc }
    end;
  end;

{ HandleRMaster has all the routines nessessary to pass data from the rawData array }
{ to a point in the tree after scaling and offseting them. }
  procedure HandleRMaster; {•(v : DMVerb;•}
                           {•     var dm : DMRec);•}

    var
      i: integer;
      h: handle;

    procedure Calibrate (var dm: DMRec);
      var { calibrate this RMaster/Offset dm. }
        dlog: DialogPtr;
        str: Str255;
        i, itemHit: integer;
        l: longInt;
    begin
      dlog := GetNewDialog(MasterDlogID, nil, Pointer(-1));
      SetEdText(dlog, 1, ntos(dm.privateWords[IntervalIdx]));
      SetEdText(dlog, 2, concat('$', AHexWord(dm.privateWords[BaudIdx])));
      RadioOn(dlog, DisplayItem, DisplayValues);
      repeat
        ModalDialog(nil, itemHit);
        if itemHit = DisplayItem then
          begin
            DisplayValues := not DisplayValues;
            RadioOn(dlog, DisplayItem, DisplayValues);
          end;
      until itemHit <= 2; { Until OK or Cancel is clicked. }
      if itemHit = 1 then
        begin { OK clicked. }
          GetEdText(dlog, 1, str);
          StringToNum(str, l);
          dm.privateWords[IntervalIdx] := l;
          GetEdText(dlog, 2, str);
          if str[1] = '$' then
            delete(str, 1, 1);
          while length(str) < 4 do
            str := concat('0', str);
          if length(str) > 4 then
            delete(str, 4, 100);
          StuffHex(@dm.privateWords[BaudIdx], str);
          dm.privateWords[DisplayIdx] := ord(DisplayValues);
        end;
      DisposDialog(dlog);
    end;

  begin
```

```
  if false then
    Announce(StringOf('Robot Master: ', v));
  case v of
    initDM:          { Called once the first time this DM is started. }
      begin
        SetDefault;
        dm.privateWords[IntervalIdx] := defaultInterval;
        dm.privateWords[BaudIdx] := defaultBaud;
        DisplayValues := false;
        Calibrate(dm);
        OpenMaster(dm);
      end;
    massageDM:       { Called once through the main loop. do a massage }
      doRMaster(dm);
    closeDM:
      CloseMaster;       { Called when this module is deleted. Do whatever... }
    reHookedDM:
      ;       { DM has been re-hooked up. }
    fopenDM:         { This DM has just been read from a file. If it's state is }
                         { on it was hooked up properly. private points to the }
      begin          { private memory it had when saved. }
        SetDefault;
        OpenMaster(dm);
      end;
    fsaveDM:         { This DM is about to be saved to a file. Do any changes }
      begin          { nessessary to private memory so it can be restored later. }
        CloseMaster;
      end;
    calibDM:         { Calibrate the DM module. }
      begin
        CloseMaster;
        Calibrate(dm);
        OpenMaster(dm);
      end;
    describeDM:      { put a description into describeStr }
      begin
        describeStr := StringOf('RMaster: ', dm.privateWords[BaudIdx] : 1, '.');
      end;
    writeCodeDM:
      ;
    otherwise        { Should be no other. }
      sysbeep(3);
  end;       { case }
 end;        { HandleRMaster }

end.
```

```
{this is a collection of routines that I frequently use.  There are no global variables.}
{many of these routines are to handle dialog boxes and some aspects of them.}
{ scott Burgess 7.5.89 }


unit scottsStuff;
interface
{   uses}

  function StringtoReal (text: string): real;
  function getNumFromEditText (DLOG: dialogPtr; itemNo: integer): integer;
  procedure NumToEditText (DLOG: dialogPtr; itemNo: integer; value: integer);
  function getRealFromEditText (DLOG: dialogPtr; itemNo: integer): real;
  procedure realToEditText (DLOG: dialogPtr; itemNo: integer; value: real);

  procedure shadeOut (area: rect);

implementation

  procedure realToEditText;
  begin
  end;


  function getNumFromEditText;
    var
      itemType: Integer;
      str2numVal: LongInt;
      item: Handle;
      box: Rect;
      text:  Str255;
  begin
    GetDItem(DLOG, itemNo, itemType, item, box);
    GetIText(item, text);
    StringToNum(text, str2numVal);
    getNumFromEditText := str2numVal;
  end;

  procedure NumToEditText;
    var
      itemType: Integer;
      item: Handle;
      box: Rect;
      text:  Str255;
  begin
    NumToString(value, text);
    GetDItem(DLOG, itemNo, itemType, item, box);
    SetIText(item, text);
  end;

  function StringtoReal (text: string): real;
    { Scott, I just took your code out of getRealFromEditText and put it into here.  Then made getReal... }
    { call this routine.   Chuck }
```

```
 var
   value: real;
   count: integer;
   badValue: boolean;
   currentValue: integer;
   fract, fractMult: real;
   int: integer;
   decimal: boolean;
   sign: integer;
begin
  decimal := false;
  count := 0;
  badValue := false;
  int := 0;
  fractMult := 0.1;
  fract := 0;
  sign := 1;
  repeat
    count := count + 1;
    currentValue := ord(text[count]) - 48;
    case currentValue of
      0, 1, 2, 3, 4, 5, 6, 7, 8, 9:
        case decimal of
          false:
            int := (int * 10) + currentValue;
          true:
            begin
              fract := (currentValue * fractMult) + fract;
              fractMult := fractMult * 0.1;
            end;
        end;
      -2:
        decimal := true;  {period}
      -3:
        sign := -1;
      otherwise
        badValue := true;
    end;
  until (count = length(text)) or (badValue);
  if badValue then
    StringtoReal := $FFFF
  else
    StringtoReal := sign * (int + fract);
end;


function getRealFromEditText; { (DLOG: dialogPtr; itemNo: integer): real}
  var
    itemType: Integer;
    item: Handle;
    box: Rect;
    text: Str255;
begin
```

```
    GetDItem(DLOG, itemNo, itemType, item, box);
    GetIText(item, text);
    getRealFromEditText := StringtoReal(text);
  end;


{this procedure grays out the contents of a rectangle by copyBitting a gray-filled box }
{into that rectangle. In this case, it is used for the text items, which do not gray themselves}
{out as do buttons. The first time that this image is called, it creates a ptr for the gray}
{image. For each rect, it fills the gray pattern so that it is actually a gray pattern, as }
{opposed to thin stripes. }

  procedure shadeOut;
  begin
    PenMode(notSrcBic);
    PenPat(gray);
    PaintRect(area);
    PenNormal;
  end;

end.
```

```
{ This unit has global variables that are specific to handling of scripts and some }
{ routines to handle scripts that the file I/O calls when opening or }
{ closing Tree or DM files. }

{ Copyright 1987 VPL Research, Inc. }
{ Chuck Blanchard 11/14/87 }

unit ScriptGlob;

interface

  uses
    ChuckStuff, AutoLib, Globals, miscRoutines;

  const
    ScriptResType = 'scpt';        { resource type for script text. }
  type
    Token = (litStr, litInt, strVar, intVar, eq, notEq, gt, ge, lt, le,{}
      boolOr, boolAnd, boolNot, bool, plus, minus, times, divide, space, cr, undef);
    TokenSet = set of Token;

    { paramType is a list of the different types of parameters that can be specified }
    { in the command lookup table. }
    paramType = (pNo, pStr, pInt, pDM, pNode, pSix, pVar, pIVar, pSVar, pEh);

    { CmdDescRec describes how a comand must be structured to be valid. }
    CmdDescRec = record
        name: nameStr;
        pType: array[0..5] of paramType;
      end;

    { cmdType is an enumurated list of all the valid commands.  To add a new }
    { command to the list, insert it's token in here before cExecute, add a call to SetCmd in }
    { initCmdList below that describes the parameters for the command and}
    { lastly, add the code for the command to the case statement in ExecuteScript}
    { which is in exScripts.pas.  }
    cmdType = (cNo, cShowText, cHideText, cPrompt, cCalib, cCalibHalf, {}
      cOpen, cSetVol, cTCut, cTCopy, cTPaste, cTClear, cSetEdPt, {}
      cChangePt, cGetPt, cAssign, cMenu, cSetItemMark, cMCheck, {}
      cMenuOn, cRem, cLabel, cIf, cShow, cPostKeys, cGoTo, {}
      cAnnounce, cNewDM, cInDM, cOutDM, cGetInDM, cGetOutDM, cSetDMState, cGetDMState,{}
      cRefresh, cWriteText, cCloseText, cAcquire, cWait, cExecute);

{ Each script is stored on disk as a resource of type ScriptResType.  The resource }
{ just has the text for the script.  The name of the resource is the name of the script. }
{ When a script is read into memory a ScriptRec is made for it.  the textHandle field }
{ in the record is a handle to the text as it was read from the file.  After the text is }
{ read in, it is detached so it is no longer a resource.  The variable ScriptsRoot is a }
{ handle to the ScriptRec for the first script.  next is a handle to the next script, etc. }
{ Note that all references to ScriptRec's or text are by handle.  All the scriptRecs }
{ and text is unlocked except when being edited or executed.}
    ScriptPtr = ^ScriptRec;
```

-000547

```
  ScriptHandle = ^ScriptPtr;
  ScriptRec = record
     next: scriptHandle;       { Handle to next ScriptRec in the list. }
     textHandle: handle;       { Handle to the text for this script. }
     dyItem: integer;          { dynamic menu Item number for this script. }
     inFile: inFileType;       { owner of the script (appl, tree, dm, none) }
     name: nameStr;            { Name of script, menu name, resource name. }
   end;

  { paramRec describes the record for parameters passed to script commands. }
  paramRec = record
     tok: token;
     int, pos, idx: integer;
     str: str255;
   end;
  paramArray = array[0..5] of paramRec;

 var
  ScriptsRoot: ScriptHandle;
  operatorToks, operandToks, unaryToks, boolToks, intOprToks, strOprToks: TokenSet;
  intToks, strToks: TokenSet;
  Cmds: array[cmdType] of CmdDescRec; { list of reconized commands. }

  TextTick: longInt;       { Time the last change was made to the showtext window }
  textup: boolean;         { true if the text dialog box is up. }
  TextdPtr: DialogPtr;{ dialog ptr for the text dialog box. }
  crChar: char;         { constant chr(13) }
  dyScriptAddr: Ptr;       { address of the routine that handles dynamic scripts. }
  showOwner: boolean;      { true if the script owner is displayed in the script menu. }

  scTextFile: Text;           { Text file written to by the 'WriteText' command. }
  scTextOpen: Boolean;

{ myMenuList is made in DSInitialize when the menus are read in.  It is a list of }
{ all the menu's used by DataSuit.  This way, the menu doesn't have to be displayed }
{ and it can still be called by scripts. }
   myMenuList: array[1..10] of MenuHandle;

 procedure InitCmdList;
 function AddScript (h: handle; newName: str255; owner: inFileType): ScriptHandle;
 procedure AddAllScripts (inType: inFileType; delFirst: boolean);
 procedure DeleteScript (sh: ScriptHandle);
 procedure DeleteAllScripts (inType: inFileType);
 procedure SaveAllScripts (inType: inFileType);

implementation

 procedure InitCmdList;
{ This routine is here so It can be found easily when adding commands.  }
   var
    c: CmdType;
   procedure SetCmd (cmd: CmdType; cName: nameStr; p1, p2, p3, p4, p5: paramType);
   begin
```

-000548

```
    with Cmds[cmd] do
      begin
        name := cName;
        pType[1] := p1;
        pType[2] := p2;
        pType[3] := p3;
        pType[4] := p4;
        pType[5] := p5;
      end;
  end;

begin
  for c := cNo to cExecute do
    Cmds[c].name := '';
  SetCmd(cChangePt, 'setpt', pNode, pSix, pInt, pNo, pNo);
  SetCmd(cGetPt, 'getpt', pIVar, pNode, pSix, pNo, pNo);
  SetCmd(cAssign, 'set', pVar, pEh, pNo, pNo, pNo);
  SetCmd(cMenu, 'menu', pEh, pStr, pNo, pNo, pNo);
  SetCmd(cMCheck, 'menuchk', pIVar, pEh, pStr, pNo, pNo);
  SetCmd(cLabel, 'label', pStr, pNo, pNo, pNo, pNo);
  SetCmd(cGoTo, 'goto', pStr, pNo, pNo, pNo, pNo);
  SetCmd(cSetDMState, 'setdmstate', pDM, pInt, pNo, pNo, pNo);
  SetCmd(cGetDMState, 'getdmstate', pIVar, pDM, pNo, pNo, pNo);
  SetCmd(cRefresh, 'refresh', pNo, pNo, pNo, pNo, pNo);
  SetCmd(cAcquire, 'acquire', pNo, pNo, pNo, pNo, pNo);
  SetCmd(cWait, 'wait', pInt, pNo, pNo, pNo, pNo);
  SetCmd(cExecute, 'execute', pStr, pEh, pEh, pEh, pEh);
  SetCmd(cAnnounce, 'message', pStr, pNo, pNo, pNo, pNo);
  SetCmd(cShowText, 'showtext', pInt, pStr, pNo, pNo, pNo);
  SetCmd(cHideText, 'hidetext', pNo, pNo, pNo, pNo, pNo);
  SetCmd(cPrompt, 'prompt', pVar, pStr, pStr, pNo, pNo);
  SetCmd(cCalib, 'calibrate', pDM, pNo, pNo, pNo, pNo);
  SetCmd(cCalibHalf, 'calibhalf', pDM, pInt, pNo, pNo, pNo);
  SetCmd(cSetVol, 'setvol', pStr, pNo, pNo, pNo, pNo);
  SetCmd(cOpen, 'open', pStr, pStr, pNo, pNo, pNo);
  SetCmd(cTCut, 'treecut', pNo, pNo, pNo, pNo, pNo);
  SetCmd(cTCopy, 'treecopy', pNo, pNo, pNo, pNo, pNo);
  SetCmd(cTPaste, 'treepaste', pNo, pNo, pNo, pNo, pNo);
  SetCmd(cTClear, 'treeclear', pNo, pNo, pNo, pNo, pNo);
  SetCmd(cSetEdPt, 'seteditpt', pNode, pNo, pNo, pNo, pNo);
  SetCmd(cSetItemMark, 'setitemmark', pEh, pStr, pEh, pNo, pNo);
  SetCmd(cMenuOn, 'menuon', pIVar, pEh, pStr, pNo, pNo);
  SetCmd(cRem, 'rem', pEh, pEh, pEh, pEh, pEh);
  SetCmd(cIf, 'if', pInt, pStr, pEh, pEh, pEh);
  SetCmd(cShow, 'showlines', pNo, pNo, pNo, pNo, pNo);
  SetCmd(cPostKeys, 'postkeys', pStr, pNo, pNo, pNo, pNo);
  SetCmd(cNewDM, 'newdm', pStr, pStr, pNo, pNo, pNo);
  SetCmd(cInDM, 'setdmin', pDM, pInt, pStr, pStr, pEh);
  SetCmd(cOutDM, 'setdmout', pDM, pInt, pStr, pSix, pNo);
  SetCmd(cGetInDM, 'getdmin', pDM, pInt, pSVar, pSVar, pIVar);
  SetCmd(cGetOutDM, 'getdmout', pDM, pInt, pSVar, pSVar, pNo);
  SetCmd(cWriteText, 'writetext', pStr, pNo, pNo, pNo, pNo);
  SetCmd(cCloseText, 'closetext', pNo, pNo, pNo, pNo, pNo);
```

```
end;

procedure axeResources (rtype: ResType);
  var
    h: Handle;
    i, id: integer;
    rname: str255;
begin
  repeat
    for i := Count1Resources(ScriptResType) downto 1 do
      begin
        h := Get1IndResource(ScriptResType, i);
        if h <> nil then
          begin
            GetResInfo(h, id, rType, rname);
            RmveResource(h);
            DisposHandle(h);
          end;
      end;          { for i }
  until Count1Resources(ScriptResType) = 0;
  UpDateResFile(CurResFile);
end;

procedure DeleteScript; { (sh : ScriptHandle) }
  var
    err: integer;
    sh1: ScriptHandle;
begin
  if dyDelItem(ScriptMHndl, sh^^.dyItem) then
    ;
  disposHandle(sh^^.textHandle);
  if sh = ScriptsRoot then
    ScriptsRoot := ScriptsRoot^^.next
  else
    begin
      sh1 := ScriptsRoot;
      while sh1^^.next <> sh do
        sh1 := sh1^^.next;
      sh1^^.next := sh1^^.next^^.next;
    end;
  disposHandle(handle(sh));
end;

procedure DeleteAllScripts; { (inType : inFileType) }
{ Delete all the scripts of the type inType from the list.  This is called when a }
{ file is closed.  This only affects what is in memory.  Not what is on disk. }
  var
    sh: ScriptHandle;
    found: boolean;
begin
  repeat
    found := false;
    sh := ScriptsRoot;
```

```
    while (sh <> nil) and not found do
      if sh^^.inFile = inType then
        found := true
      else
        sh := sh^^.next;
    if found then
      DeleteScript(sh);
  until not found;
end;

function AddScript; {• (h : handle;•}
                    {•     newName : str255;•}
                    {•     owner : inFileType) : ScriptHandle;•}
{ h is a handle to an already existing block of text. It isn't associated with any res }
{ file. Add a new script to the scriplist and the menu with this text/name. }
  var
    sh, sh1: ScriptHandle;
    i: integer;
    markChars: packed array[1..4] of char;
begin
  sh := ScriptHandle(NewHandle(sizeof(ScriptRec)));
  if sh = nil then
    Announce(concat('Memory error ', ntos(MemError)))
  else
    begin
      HLock(Handle(sh));
      with sh^^ do
        begin
          name := newName;
          inFile := owner;
          texthandle := h;
          next := nil;
          if name[1] = '.' then    { Scripts starting with '.' don't show up. }
            dyItem := 0
          else
            begin
              dyitem := dyNewItem(scriptMHndl, newName, DyScriptAddr, true);
              if showOwner then
                begin
                  i := dyItemtoItem(scriptMHndl, dyitem);
                  markChars := 'atdn';
                  SetItemMark(scriptMHndl, i, markChars[ord(inFile) + 1]);
                end;
            end;
        end;
      HUnlock(Handle(sh));
      if ScriptsRoot = nil then        { if first script then stick to root }
        ScriptsRoot := sh
      else
        begin
          sh1 := ScriptsRoot;          { else run down the list till }
          while sh1^^.next <> nil do   { you find the end. }
            sh1 := sh1^^.next;
```

-000551

```
        sh1^^.next := sh;            { stick new item on the end of list }
      end;
    end;
   AddScript := sh;
 end;   { AddScript }

 procedure AddAllScripts; {(inType : inFileType; delFirst: boolean)}
{ The current resource file has been set.  Add all of the scripts in the current }
{ resource file to the script list and the script menu.  Detatch the text handles so }
{ they are not associated with the current resource file.  If delFirst is true then }
{ first delete all scripts that are of the given infiletype. }
   var
     h: Handle;
     i, id: integer;
     rType: ResType;
     rname: str255;
     sh: ScriptHandle;
 begin
   if delFirst then
     DeleteAllScripts(inType);
   for i := 1 to Count1Resources(ScriptResType) do
     begin
       h := Get1IndResource(ScriptResType, i);
       if h <> nil then
         begin
           GetResInfo(h, id, rType, rname);
           DetachResource(h);
           sh := AddScript(h, rname, inType);
         end;
     end;       { for i }
 end;   { AddAllScripts }

 procedure SaveAllScripts; {(inType : inFileType)}
   var
     h: Handle;
     i, id, err: integer;
     sh: ScriptHandle;
 begin
   axeResources(ScriptResType);
   sh := ScriptsRoot;
   while sh <> nil do
     begin
       if sh^^.inFile = inType then
         begin
           h := sh^^.textHandle;
           err := HandToHand(h);
           if err <> noErr then
             Announce(concat('Error writing scripts out. ', ntos(err)))
           else
             begin
               id := UniqueID(ScriptResType);
               AddResource(h, ScriptResType, id, sh^^.name);
               WriteResource(h);
```

-000552

```
            ReleaseResource(h);
          end;
        end;
      sh := sh^^.next;
    end;
  end;
end.
```

```
{ Put up a dialog box to edit the list of scripts currently installed. }
unit ScriptList;

interface
  uses
    ChuckStuff, AutoLib, Globals, Tree3DGlob,{}
    DMTypes, DMGlobals, ScriptGlob, EditScriptUnit;

  function AddNewScript (var sh: ScriptHandle): boolean;
  procedure EditScriptList;

implementation

  var
    listH: ListHandle;
    listBox: Rect;

  function AddNewScript; { (var sh : ScriptHandle) : boolean }
{ Try to add a new script and let the user edit it. Return true and the handle }
{ if successful, else return false and nil. }
    var
      h: handle;
      name: string;
      i, curRes, err: integer;
      ch: CharsHandle;
  begin
    sh := nil;
    name := concat('rem NewScript', chr(13));
    h := newHandle(length(name));
    err := MemError;
    if err = noErr then
      begin
        ch := CharsHandle(h);
        for i := 1 to length(name) do
          ch^^[i - 1] := name[i];
        name := 'NewScript';
        sh := AddScript(h, name, applRad);
        if sh <> nil then
          EditScript(sh);
      end;
    if err <> noErr then
      Announce(concat('Add error ', ntos(err)));
    AddNewScript := (sh <> nil) and (err = noErr);
  end;

  function EdDMLFilter (dlg: DialogPtr; var evt: EventRecord; var itemHit: integer): boolean;
    var
      pt: Point;
      oldPort: grafPtr;
  begin
    GetPort(oldPort);
    SetPort(dlg);
```

```
  EdDMLFilter := false;
  pt := evt.where;
  GlobaltoLocal(pt);
  case evt.what of
    mouseDown:
      if PtInRect(pt, listBox) then
        begin
          if LClick(pt, evt.modifiers, listH) then
            itemHit := EdDMedItem{ double click occured }
          else
            itemHit := ListItem;
          EdDMLFilter := true;
        end;
    otherwise
      ;
  end;
  SetPort(oldPort);
end;

procedure EdDMLusrDraw (theWindow: WindowPtr; itemNo: integer);
  var
    r: rect;
begin
  r := listBox;
  insetRect(r, -1, -1);
  FrameRect(r);
  LUpdate(theWindow^.visRgn, listH);
end;

{ Edit the list of scripts. }
procedure EditScriptList;
  var
    i, j, hitItem: integer;
    dlogPtr: DialogPtr;
    ItemH: Handle;
    db, box: Rect;
    c: Point;
    str: string;
    sh: ScriptHandle;
    newInFile: InFileType;

  procedure SetItems; { Set the state of controls in the EditDM dialog box. }
    var
      Itype, show: integer;
      box: Rect;
      itemH: Handle;
      itemCH: ControlHandle;
      str: string;
  begin
    SetPt(c, 0, 0);
    GetDItem(dlogPtr, EdDMdelItem, Itype, itemH, box);
    if ScriptsRoot <> nil then          { dim Delete if no items to delete. }
      show := 0
```

```
    else
      show := 255;
    itemCH := pointer(ItemH);
    HiliteControl(itemCH, show);
    GetDItem(dlogPtr, resetItem, Itype, itemH, box);
    itemCH := pointer(ItemH);        { rename 'Configure' to file state. }
    case newInFile of
      applRad:
        str := 'Appl';
      DMRad:
        str := 'DM file';
      TreeRad:
        str := 'Tree file';
      NoneRad:
        str := 'None';
    end;
    SetCTitle(itemCH, str);
  end;

  function FindScriptIdx (index: integer): scriptHandle;
{ Given an index 0..., return the script handle at that index down the script list }
{ (ScriptsRoot points to index 0). If not enough scripts return nil. }
    var
      sh: ScriptHandle;
      i: integer;
  begin
    sh := ScriptsRoot;
    for i := 1 to index do
      if sh <> nil then
        sh := sh^^.next;
    FindScriptIdx := sh;
  end;

  procedure DeleteOne; { If an item is selected in the EdDM dialog box list }
    var                { Then delete it. }
      c: Cell;
      sh: ScriptHandle;
  begin
    SetPt(c, 0, 0);
    if LGetSelect(true, c, listH) then
      sh := FindScriptIdx(c.v);
    if sh <> nil then
      begin
        DeleteScript(sh);
        LDelRow(1, c.v, listH);
      end;
    SetItems;
  end;

  function ownerStr (sh: ScriptHandle): string;
    var
      markChars: packed array[1..4] of char;
```

```
    begin
      markChars := 'atdn';
      ownerStr := concat(markChars[ord(sh^^.inFile) + 1], ' ', sh^^.name);
    end;

  begin
    ParamText('Script list', '', '', '');
    dlogPtr := GetNewDialog(DMListID, nil, Pointer(-1));
    GetDItem(dlogPtr, ListItem, i, ItemH, listBox);
    SetDItem(dlogPtr, ListItem, userItem, @EdDMLusrDraw, listBox);
    newInFile := applRad;
    SetItems;
    box := listBox;
    box.right := box.right - 15;
    SetRect(db, 0, 0, 1, 0);
    SetPt(c, 0, 0);
    listH := LNew(box, db, c, 0, dlogPtr, true, false, false, true);
{•  listH^^.selFlags := lOnlyOne;•}
    sh := ScriptsRoot;
    c.v := 0;
    while sh <> nil do
      begin
        c.h := 0;
        str := ownerStr(sh);
        i := LAddRow(1, listH^^.dataBounds.bottom, listH);
        LSetCell(pointer(ord4(@str) + 1), length(str), c, listH);
        sh := sh^^.next;
        c.v := c.v + 1;
      end;
    repeat
      ModalDialog(@EdDMLFilter, hitItem);
      case hitItem of
        EdDMaddItem:
          if AddNewScript(sh) then
            begin
              str := ownerStr(sh);
              i := LAddRow(1, listH^^.dataBounds.bottom, listH);
              SetPt(c, 0, i);
              LSetCell(pointer(ord4(@str) + 1), length(str), c, listH);
              SetItems;
            end;
        EdDMdelItem:
          DeleteOne;
        EdDMedItem:
          begin
            SetPt(c, 0, 0);
            if LGetSelect(true, c, listH) then
              begin
                sh := FindScriptIdx(c.v);
                if sh <> nil then
                  EditScript(sh)
                else
                  sysbeep(1);
```

```
        end;
      end;
    ResetItem:    { this item is changed to be 'Appl', 'DM', 'Tree' or 'None'. }
      begin       { based on newInFile.  Change all selections to newInFile }
        SetPt(c, 0, 0);
        while LGetSelect(true, c, listH) do
          begin  { at least one selected. }
            sh := FindScriptIdx(c.v);
            if sh <> nil then
              begin
                ChangeOwner(sh, newInFile);
                str := ownerStr(sh);
                LSetCell(pointer(ord4(@str) + 1), length(str), c, listH);
              end;
            c.v := c.v + 1;
          end;
        if newInFile = NoneRad then
          newInFile := ApplRad
        else
          newInFile := succ(newInFile);
        SetItems;
      end;
    OnOffItem:
      ;
    otherwise
      ;
  end;    { case }
 until hitItem <= 1;
 LDispose(listH);
 DisposDialog(dlogPtr);
end;    { EditDMList }

end.
```

```
unit ScriptParse;
interface
  uses
    ChuckStuff, Globals, ScriptGlob;

  type
    varRecord = record
        ints: array[0..9] of integer;
        strs: array[0..9] of string;
        errStr: string;
        errNum, offset, charCount: integer;
        textPtr: charsPtr;
      end;

  var
    gv: varRecord;  { so all units can access what should be variables }
                    { local to the ExecuteScript procedure. }

  procedure lowcase (var str: str255);
  function strIsSix (str: string): integer;

  function ExtractSym (var last: paramRec): Token;

  function ExtractExpression (var last: paramRec): Token;

implementation

  procedure lowcase; { (var str : str255) }
    var   { change str to lowercase }
      i: integer;
  begin
    for i := 1 to length(str) do
      if (str[i] >= 'A') and (str[i] <= 'Z') then
        str[i] := chr(ord(str[i]) + ord('a') - ord('A'));
  end;

  function strIsSix; { (str : string) : integer }
{ return the sixType index for this string.  If it isn't a valid sixType then return -1. }
  begin
    if str = 'x' then
      strIsSix := 0
    else if str = 'y' then
      strIsSix := 1
    else if str = 'z' then
      strIsSix := 2
    else if str = 'yaw' then
      strIsSix := 3
    else if str = 'pitch' then
      strIsSix := 4
    else if str = 'roll' then
      strIsSix := 5
    else
```

-000559

```
    strIsSix := -1;
  end;

  function ExtractSym;
{ Extract the next token from the input stream.  Return the token type. }
    var
      ch: char;
      newSym: Token;

    function NextChar: char;
      { return the value of the next character of the input stream }
    begin
      if gv.offset >= gv.charCount then
        NextChar := crChar
      else
        begin
          NextChar := gv.textPtr^[gv.offset];
          gv.offset := gv.offset + 1;
        end;
    end; {NextChar}
    procedure BackChar;
    begin
      if (gv.offset > 0) and (gv.offset < gv.charCount) then
        if gv.textPtr^[gv.offset] <> crChar then
          gv.offset := gv.offset - 1;
    end;

    procedure ScanNumber;
      { set last.Int to the value of the constant }
      var
        str:  str255;
        l: longInt;
    begin
      str := ch;
      ch := NextChar;
      while (Ch in ['0'..'9']) do
        begin
          str := concat(str, ch);
          ch := NextChar;
        end;
      Backchar;
      StringtoNum(str, l);
      last.Int := l;
      newSym := litInt;
    end; {ScanNumber}

    procedure ScanName;
    begin
      last.Str := ch;
      ch := NextChar;
      while (Ch in ['A'..'Z', 'a'..'z', '0'..'9', '_']) do
        begin
          last.Str := concat(last.Str, ch);
```

```
      ch := NextChar;
    end;
   Backchar;
   newSym := litStr;
  end;

  procedure ScanString;
   var
    ch1: char;
    flag: boolean;
  begin
   last.Str := '';
   flag := false;
   repeat
    ch := NextChar;
    ch1 := ch;
    if ch = '\' then
     begin
      ch := NextChar;
      if ch in ['0', '1', '2', '3', '4', '5', '6', '7', '8', '9'] then
       begin
        ScanNumber;
        ch := chr(last.Int);
       end
      else
       begin
        ch := ch1;
        BackChar;
       end;
     end;
    if (ch1 <> crChar) and (ch1 <> '"') then
     last.Str := concat(last.Str, ch)
    else
     flag := true;
   until flag;
   if ch1 = crChar then
    BackChar;
   newSym := litStr;
  end;

 begin
  newSym := undef;
  last.pos := gv.offset;
  ch := NextChar;
  if ch = crChar then
   begin
    newsym := cr;
    BackChar;
   end
  else
   case ch of
    ';':
     begin
```

-000561

```
repeat
until NextChar = crChar;
newsym := cr;
BackChar;
last.pos := gv.offset;
end;
'A', 'B', 'C', 'D', 'E', 'F', 'G', 'H', 'I', 'J', 'K', 'L', 'M', 'N', 'O', 'P', 'Q', 'R', 'S', 'T', 'U', 'V', 'W', 'X',
'Y', 'Z', 'a', 'b', 'c', 'd', 'e', 'f', 'g', 'h', 'i', 'j', 'k', 'l', 'm', 'n', 'o', 'p', 'q', 'r', 's', 't', 'u', 'v', 'w',
'x', 'y', 'z':
 ScanName;
'0', '1', '2', '3', '4', '5', '6', '7', '8', '9':
 ScanNumber;
'"':
 ScanString;
'%', '$':
 begin
   if ch = '%' then
     newSym := intVar
   else
     newSym := strVar;
   ch := NextChar;
   if ch in ['0'..'9'] then
     begin
       last.Idx := ord(ch) - ord('0');
       last.Int := gv.ints[last.Idx];
       last.Str := gv.strs[last.idx];
     end;
 end;
'+':
 newSym := plus;
'-':
 newSym := minus;
'*':
 newSym := times;
'/':
 newSym := divide;
'=':
 newSym := eq;
'~':
 newSym := boolNot;
'|':
 newSym := boolOr;
'&':
 newSym := boolAnd;
' ', '	':                    { space and tab are a space }
 newSym := space;
'>', '<':
 begin
   if ch = '>' then
     newSym := gt
   else
     newSym := lt;
   ch := NextChar;
```

-000562

```
        if ch = '=' then
          newSym := succ(newSym)
        else if (newSym = lt) and (ch = '>') then
          newSym := noteq
        else
          BackChar;
      end;
    otherwise
      newSym := undef;
  end; { case ch }
  last.tok := newSym;
  ExtractSym := newSym;
end;    { ExtractSym }

function ExtractExpression; { (var last: paramRec) : Token}
  var
    exprState: (valid, finishedOK, invalidOpr, invalidOprd);
    op1, expr: paramRec;
    operPos: integer;
    tok2, operTok: Token;
    tempSet: TokenSet;

  procedure doBoolean (t: Token);
    var
      i: integer;
      b: boolean;
  begin
    expr.Tok := bool;
    if t = litStr then
      i := IUCompString(op1.Str, last.Str) {  -1 : 1 < 2,  0 : 1 = 2, 1 : 1 > 2 }
    else
      begin
        if op1.int < last.Int then
          i := -1
        else if op1.int = last.Int then
          i := 0
        else
          i := 1;
      end;
    case opertok of
      eq:
        b := (i = 0);
      notEq:
        b := (i <> 0);
      gt:
        b := (i = 1);
      ge:
        b := (i <> -1);
      lt:
        b := (i = -1);
      le:
        b := (i <> 1);
      boolOr:
```

-000563

```
      b := (op1.int <> 0) or (last.int <> 0);
    boolAnd:
      b := (op1.int <> 0) and (last.int <> 0);
  end; { case }
  if b then
    expr.Int := 1
  else
    expr.Int := 0;
end;      { doBoolean }

procedure BothSame (tokType: Token; operandSet: TokenSet);
begin
  if not (opertok in operandSet) then
    exprState := invalidOpr
  else
    begin
      expr.Tok := tokType;
      if opertok in boolToks then
        doBoolean(tokType)
      else if tokType = litStr then       { only string math is plus }
        expr.Str := concat(op1.Str, last.Str)
      else
        case operTok of
          plus:
            expr.Int := op1.Int + last.Int;
          minus:
            expr.Int := op1.Int - last.Int;
          times:
            expr.Int := op1.Int * last.Int;
          divide:
            expr.Int := op1.Int div last.Int;
        end;      { case }
    end;      { if valid operator }
end;      { BothSame }

procedure ExtractUnary (tok: Token; var p: paramRec);
  var
    lastpos: integer;
begin
  lastpos := p.pos;
  last.tok := ExtractSym(p);
  if not (p.tok in intToks) then
    p.tok := undef
  else if tok = minus then
    p.int := p.int * (-1)
  else if tok = boolNot then
    if p.int = 0 then
      p.int := 1
    else
      p.int := 0;
  p.pos := lastpos;
end;
begin
```

-000564

```
repeat
until ExtractSym(op1) <> space;
if op1.tok in unaryToks then
  ExtractUnary(op1.tok, op1);
if (op1.tok in operandToks) then
  exprState := valid
else if op1.tok = cr then
  exprState := finishedOK
else
  exprState := invalidOprd;
while exprState = valid do
  begin
    opertok := ExtractSym(last);
    if not (opertok in operatorToks) then
      begin
        exprState := finishedOK;
        gv.offset := last.pos;
      end
    else
      begin
        tok2 := ExtractSym(last);
        if tok2 in unaryToks then
          ExtractUnary(tok2, last);
        tempSet := [op1.Tok, last.tok];
        if (tempSet + strToks = strToks) then
          BothSame(litStr, strOprToks)              { both strings. }
        else if (tempSet + intToks = intToks) then
          BothSame(litInt, intOprToks)              { both integers. }
        else if (tempSet + strToks + intToks = strToks + intToks) then
          begin      { one str, one int.  convert int to str. }
            if op1.tok in intToks then
              op1.str := ntos(op1.int)
            else
              last.str := ntos(last.int);
            BothSame(litStr, strOprToks);
          end
        else
          exprState := invalidOprd;
      end;
    if exprState = valid then
      op1 := expr;    { move the result of A ? B into A so can handle A ? B ? C... }
  end; { while }
 case exprState of
  valid, finishedOK:
    begin
      last := op1;
      ExtractExpression := op1.Tok;
    end;
  invalidOpr:
    begin
      ExtractExpression := undef;
      gv.errStr := 'Invalid Operator';
    end;
```

-000565

```
     invalidOprd:
       begin
         ExtractExpression := undef;
         gv.errStr := 'Invalid Operand';
       end;
   end;  { case }
 end; { ExtractExpression }

end.
```

```
{ This unit handles text script commands.  For each command, a menu Item }
{ is made.  When the menu item is selected the script is executed.  A script is }
{ text that has a list of commands to execute.  ie: }
{ showText 'Calibrate your inner finger joints.' }
{ calibrate FingerMPJ }
{ showText 'Now calibrate your outer finger joints.' }
{ calibrate FingerIPJ }
{ etc... }

unit Scripts;

interface
  uses
    ChuckStuff, AutoLib, Globals, Tree3dGlob, FastStuff, miscRoutines, {}
    DMTypes, DMGlobals, ScriptGlob, FileIO, ScriptParse, EditScriptUnit, exScript, ScriptList;

  function ExScriptName (str: string): boolean;
  procedure doScriptMenu (item_No: integer);      { addr given out so declare (a5) }
  procedure InitScripts;
  procedure ExScriptStartup (message: longInt);
  procedure CloseScripts;

implementation

  const
    AddScriptItem = 1;
    EdScriptItem = 2;             { script menu 'Edit Script' }


  procedure DynamicScript (hitDy: integer);
{ This routine is called through the dynamic menu routines to handle a script. }
    var
      found: boolean;
      sh: ScriptHandle;
  begin
    found := false;
    if ScriptsRoot <> nil then
      begin
        sh := ScriptsRoot;
        repeat
          if sh^^.dyItem = hitDy then
            begin
              textup := false;
              if ExecuteScript(sh, '') then
                ;
              if textup then
                doText(false, '');
              found := true;
            end
          else
            sh := sh^^.next;
        until found or (sh = nil);
      end;
```

-000567

```
    if not found then
      sysbeep(3);
  end;

  function ExScriptName; { (str : string): boolean; }
{ Execute the named script. }
    var
      sh: ScriptHandle;
  begin
    ExScriptName := false;
    sh := FindScript(str);
    if sh <> nil then
      begin
        ExScriptName := true;
        textup := false;
        if ExecuteScript(sh, '') then
          ;
        if textup then
          doText(false, '');
      end
    else
      sysbeep(3);
  end;

  procedure doScriptMenu;   { (item_No: integer) }
{ User has selected something on the Script Menu.  do it. }
    var
      sh: ScriptHandle;
      b: boolean;
  begin
    if item_No = AddScriptItem then
      b := AddNewScript(sh)
    else if item_No = EdScriptItem then
      EditScriptList
    else
      sysbeep(3);
    UnloadSeg(@EditScriptList);
  end;    { doScriptMenu }

  procedure InitScripts;
{ Called at the beginning of the program. }
    var
      i: integer;
  begin
    UseResFile(ApplRes);
    dyScriptAddr := @dynamicScript;
    TextTick := Ticks^;
    textup := false;          { text dialog box isn't up. }
    showOwner := false;      { script owner now shown in script list dialog. }
    ScriptsRoot := nil;
    strToks := [litStr, strVar];
    intToks := [litInt, intVar, bool];
    operandToks := strToks + intToks;
```

```
    boolToks := [eq, notEq, gt, ge, lt, le, boolAnd, boolOr];
    unaryToks := [plus, minus, boolNot];
    intOprToks := [plus, minus, times, divide] + boolToks;
    strOprToks := [plus] + boolToks;
    operatorToks := intOprToks + strOprToks;
    scTextOpen := false;
    InitCmdList;
    for i := 0 to 9 do
      begin     { Initialize script variables so the globals start out 0. }
        gv.ints[i] := 0;
        gv.strs[i] := '';
      end;
    AddAllScripts(applRad, false);
  end;   { InitScripts }

  procedure exScriptStartup; { (message: longInt) }
{ Everything in the system has been initialized.  Now execute the startup script if }
{ there is one. }
    var
      sh, startsh: ScriptHandle;
  begin
    sh := ScriptsRoot;
    startsh := nil;
    while (sh <> nil) and (startsh = nil) do
      begin
        if (sh^^.name = '.Startup') then
          if (sh^^.inFile = applRad) and (BitAnd(message, ApplStartBit) <> 0) then
            startsh := sh
          else if (sh^^.inFile = treeRad) and (BitAnd(message, TreeStartBit) <> 0) then
            startsh := sh
          else if (sh^^.inFile = dmRad) and (BitAnd(message, DMStartBit) <> 0) then
            startsh := sh;
        sh := sh^^.next;
      end;
    if startsh <> nil then
      begin
        if ExecuteScript(startsh, '') then
          ;
      end;
    if textup then
      doText(false, '');
  end;

  procedure CloseScripts;
    var
      oldResNum: integer;
  begin
    scCloseText;
    oldResNum := CurResFile;
    UseResFile(applRes);
    SaveAllScripts(applRad);
    UseResFile(oldResNum);
  end;
```

-000569

```
end.
```

```
{ this is a new, improved means of setting up serial communications.  Basically, what it does is }
{ poll all of the possible serial ports (as set up in the DA config DLOG), assign each DA module }
{ its own port, and allocate memory for each DA. }

{How this new set up works:}
{  The new routine to set up all of the serial communications is SetPortsAvailable.  This is called where the
        other}
{  ports are being set up.  This routine in turn calls fillPortsAvailable, which fills the global currentPorts
        with}
{  the ports that can be used based on the DAConfigBits. }
{       currentPorts is a longint that has bits set for each of the ports.  Bit 1 is the modem port, bit 2 is the }
{  printer port, bits 3 on are for serial cards if they exist.  To determine if a port is available, call
        isPortAvail,}
{  passing it the portNum (1..16).  It will return true if the port is active and not used by another object.  To}
{  disable a port, call disablePort (with the port number), which will mask out a port.  Use disablePort when
        }
{  an error has occurred on the driver or when something has claimed the port as its own.}

{.last revision 4.21.89 }

{ by Scott Burgess }
{ 1989 VPL Research, Inc.}


unit serialSetUp;

interface

  uses
    CompileTime, ChuckStuff, AutoLib, Globals, FastStuff, serialTypes, serialRoutines, MiscRoutines,
        initMIDI,{}
    pollO, PolDAmod, DAGloveIO, gloveIOandDMs, GBIIBox;

  procedure fillPortsAvailable;
  procedure setPortsAvailable;
  procedure ClosePorts;

implementation

{$ifc DoHost }
  const
    hostPort = portA;         { Hardwired port the host communication comes in on. }
    { Declared external here because it it actually below this (In HostCom.pas) in the build order. }
  procedure OpenHost (portNum: integer);
  external;
  procedure CloseHost;
  external;
{$endc}

  function CmdPeriod: boolean;
{ Return true if command-period has been hit. }
    var
      bool: Boolean;
```

-000571

```
    Event: EventRecord;
  begin
    CmdPeriod := false;
    if EventAvail(keyDownMask, Event) then
      begin
        if (chr(BAND(Event.message, $FF)) = '.') and (BitAnd(Event.modifiers, cmdKey) = cmdKey) then
          begin
            bool := GetNextEvent(keyDownMask, Event);
            CmdPeriod := true;
          end;
      end;
  end;


{puts all of the active serial ports into current ports}
  procedure fillPortsAvailable;
  begin
    currentPorts := [];
    if (modemP in DAconfig.serialConfig) then
      currentPorts := currentPorts + [portA];
    if (printerP in DAconfig.serialConfig) then
      currentPorts := currentPorts + [portB];
    if (creativeSC in DAconfig.serialConfig) then
      currentPorts := currentPorts + [portC, portD, portE, portF];
    if (superMacC in DAconfig.serialConfig) then
      currentPorts := currentPorts + [portG, portH, portI, portJ];
  end;


{looks at the ports, finds who is on them, and allocates the proper memory}
  procedure setPortsAvailable;
    var
      portTest, i, loop: integer;
      lastPort: integer;
      mErr: integer;
      refer, portName: str255;
      hasHome: Boolean;

  begin

{first check to see if the card is really installed. The superMac code also finds the}
{right slot to search.}
    if (creativeSC in DAconfig.serialConfig) then
      isCSCardReallyThere;
    if (superMacC in DAconfig.serialConfig) then
      isSMCardReallyThere;

    fillPortsAvailable;     {determines which ports are available and sets currentPorts to it }

{initialize polhemus array (allocate first block for testing), set the count, and get the baud rate }
    polhmBaudR := getBaudRates(DAconfig.polhmBaud);
    numPolhms := 1;
```

-000572

```
   for i := 1 to totalMaxPolhms do
     polhms[i] := nil;
   ptr(polhms[1]) := NewPtr(sizeOf(polhmSerialBlock));
   polhms[1]^.serBlock.dar.state := DAoff;
   polhms[1]^.found := false;

{initialize glove array (allocate first block for testing), set the count, and get the baud rate }
   gloveBaudR := getBaudRates(DAconfig.gloveBaud);
   numGloves := 1;
   for i := 1 to totalMaxGBoxes do
     gBoxes[i] := nil;
   ptr(gBoxes[1]) := NewPtr(sizeOf(gloveBoxBlock));
   gBoxes[1]^.serBlock.dar.state := DAoff;
   gBoxes[1]^.found := false;

   midiState := false;  {initialize midi to off}

   announce('Please wait a moment while the serial communications are being initialized...');
   announce('');

   if (midiBit in DAconfig.bits) then
     initMIDI;

   for portTest := 1 to 16 do
     begin

       currentPortNum := portTest;    {the for must be local, but we need a global}

       if not CmdPeriod then
         begin
{$ifc DoHost }
           if (portTest = hostPort) then
             begin
               if (hostBit in DAconfig.bits) then
                 DisablePort(portTest);
               OpenHost(portTest); { Do this no matter what.  It also checks hostBit but needs to be called all
       the time. }
             end;
{$endc}

{two globals describing the currentPort (portTest and currentPortNum)}
           portError := 0;    {has an error occurred on this port?}
           hasHome := false;  {is there an item on this port?}

           if isPortAvail(portTest) then
             begin
               if (polhmBit in DAconfig.bits) and (numPolhms < DAconfig.maxPolhms + 1) then
                 begin
                   if TestForPol(portTest, polhms[numPolhms]) then
                     begin
                       polhms[numPolhms]^.found := true;
                       disablePort(portTest);
```

—000573

```
                ptr(polhms[numPolhms + 1]) := NewPtr(sizeOf(polhmSerialBlock));
                polhms[numPolhms + 1]^.found := false;
                numPolhms := numPolhms + 1;

                i := PolDA(polhms[numPolhms - 1], initDA);
                hasHome := true;

                if i > testFailed then
                  polhms[numPolhms - 1]^.serBlock.dar.state := DAon;
              end;
            end;  {polhemus stuff}

          if not hasHome and (portError = 0) and (GBIIBit in DAconfig.bits) and (numGloves <
    DAconfig.maxGBoxes + 1) then
            begin
              if testforGBox(gBoxes[numGloves], portTest) then
                begin
                  gBoxes[numGloves]^.found := true;
                  disablePort(portTest);
                  ptr(gBoxes[numGloves + 1]) := NewPtr(sizeOf(gloveBoxBlock));
                  gBoxes[numGloves + 1]^.found := false;
                  numGloves := numGloves + 1;

                  i := GBIIBox(gBoxes[numGloves - 1], initDA);
                  hasHome := true;

                  if i > testFailed then
                    gBoxes[numGloves - 1]^.serBlock.dar.state := DAon;
                end;
            end;  {Gbox stuff}

          if not hasHome and (portError = 0) then
            begin
              portName := UserPortName(portTest);
              announce(stringof('No connections have been made on the ', portName));
            end;
        end;
      end{ if not CmdPeriod }
    else
      begin
        portTest := 16;
        Announce('Cancelling search for connections (because of Command-Period)');
      end;
  end;  {loop}

announce('');

for loop := 1 to totalMaxPolhms do
  if polhms[loop] <> nil then
    if polhms[loop]^.found = false then
      begin
        numPolhms := numPolhms - 1;
        disposPtr(ptr(polhms[loop]));
```

```
        polhms[loop] := nil;
      end;

  for loop := 1 to totalMaxGBoxes do
    if gBoxes[loop] <> nil then
      if gBoxes[loop]^.found = false then
        begin
          numGloves := numGloves - 1;
          disposPtr(ptr(gBoxes[loop]));
          gBoxes[loop] := nil;
        end;
  if numGloves <> 0 then
    announce(stringof(numGloves, ' GloveBoxes found and connected'));
  if numPolhms <> 0 then
    announce(stringof(numPolhms, ' Polhemuses found and connected'));

end;

procedure ClosePorts;
  var
    i, k: integer;
begin
  if gbIIBit in DAConfig.bits then
    for i := 1 to numGloves do
      begin
        k := GBIIBox(gBoxes[i], closeDA);
        DisposPtr(Ptr(gBoxes[i]));
      end;
  numGloves := 0;
  if polhmBit in DAConfig.bits then
    for i := 1 to numPolhms do
      begin
        k := PolDA(polhms[i], closeDA);
        DisposPtr(Ptr(polhms[i]));
      end;
  numPolhms := 0;
  resetMIDI;                  { !!! what happens when you reset midi on close, then reinitialize after dialog
      comes up? }
{$ifc DoHost }
  CloseHost;
{$endc }
 end;
end.
```

-000575

03/24/90 16:48 serialRoutines.pas Page 1

```
{ a collection of routines that are shared by all of the DAs that use the }
{ serial ports.  Originally, there were several copies of each of these}
{ routines, called "GBclearInBuff" and "PolClearInBuff" that had exactly }
{ the same code!??! }

{ by Scott Burgess}
{ 1989 VPL Research }

unit serialRoutines;

interface

  uses
    Serial, FastStuff, AutoLib, globals, miscRoutines, serialTypes;

  const
    SlowWait = 2000;

  function WriteOut (var serBlock: serBlockRec; str: str255; sync: boolean; wait: integer): integer;
  function WriteOutBuff (var serBlock: serBlockRec; theData: Ptr; count: longint; sync: boolean): integer;
  function readIn (var serBlock: serBlockRec; buffPtr: ptr; count: longint; synch: boolean): integer;

  function UserPortName (refer: integer): string;
  function openADriver (baud: integer; whom: str255; var SerBlock: serBlockRec; HardShake: Boolean):
       Boolean;
  procedure reportIOErrors (err1, err2, err3, err4: integer; where: str255);
  procedure setUpSerialRec (var SerBlock: serBlockRec);
  procedure setUpPort (thePortNum: integer; var serBlock: serBlockRec);
  function DriverPortName (thePortNum: integer; inName: Boolean): string;
  procedure closeSerial (var SerBlock: serBlockRec);
  procedure clearInBuff (var SerIn: ParamBlockRec);
  procedure disablePort (portNum: integer);
  procedure EnablePort (portNum: integer);
  function isPortAvail (portNum: integer): Boolean;

  function getBaudRates (bauds: baudTypeSet): integer;
  procedure isCSCardReallyThere;
  procedure isSMCardReallyThere;

  procedure AliveAndWell (name, port: string);

  function popUpPortNames (topLeft: point; lastOne: integer): integer;

implementation

{if we can't open the first port of the creative solutions serial card,}
{we'll assume that it doesn't exist to save time looking on four non-}
{existent ports.}
  procedure isCSCardReallyThere;
    var
      tempRefNum, error: integer;
  begin
    error := openDriver('.Ein', tempRefNum);
```

-000576

```
   if (error <> 0) then
     begin
       announce('Can'' t find Creative Solutions card ');
       DAconfig.serialConfig := DAconfig.serialConfig - [creativeSC];
     end;
 end;


{NOTE:  commCard naming conventions from Paul's comments: }
{'.CommCardInXY'' and '. CommCardOutXY ' resp. where:  }
{    - X is the slot number in hexadecimal ( 9 - e ) , is always lowercase }
{    - Y is the port number 0 - 3 where port 0 is the top port on the}
{CommCard and 3 is the lower port}

{this code tries to open drivers on all of the possible commCard nubus}
{slots.  Because they are accessed through the driver table and not}
{directly through the nubus, we are allowed to make the rash move of}
{knowingly searching for something that doesn't exist.  (do this with}
{the adios card and kablooey...)}

 procedure isSMCardReallyThere;
   var
     tempRefNum, error: integer;
 begin
   superSlot := '';
   if (openDriver('.CommCardIn90', tempRefNum) = 0) then
     superSlot := '9';
   if (openDriver('.CommCardIna0', tempRefNum) = 0) then
     superSlot := 'a';
   if (openDriver('.CommCardInb0', tempRefNum) = 0) then
     superSlot := 'b';
   if (openDriver('.CommCardInc0', tempRefNum) = 0) then
     superSlot := 'c';
   if (openDriver('.CommCardInd0', tempRefNum) = 0) then
     superSlot := 'd';
   if (openDriver('.CommCardIne0', tempRefNum) = 0) then
     superSlot := 'e';

   if superSlot = '' then
     begin
       announce('Can''t find SuperMac card');
       DAconfig.serialConfig := DAconfig.serialConfig - [superMacC];
     end;
 end;


{looks at the DAconfig.baud settings and extracts a usable baud }
{rate setting from them.  Called early, before any communications}
{take place.}
 function getBaudRates;
   var
     baud, stops: integer;
 begin
```

-000577

```
  if b192 in bauds then
    baud := baud19200;
  if b96 in bauds then
    baud := baud9600;
  if b48 in bauds then
    baud := baud4800;
  if s1 in bauds then
    stops := stop10;
  if s15 in bauds then
    stops := stop15;
  if s2 in bauds then
    stops := stop20;

  getBaudRates := baud + noParity + stops + data8;        {CC04 hex}

end;


function WriteOut (var serBlock: serBlockRec; str: str255; sync: boolean; wait: integer): integer;
  var
    i, x: integer;
begin  { write this string out to the glove box, no questions asked. }
  with serBlock.SerialOut do
    begin
      ioBuffer := Ptr(ord4(@str) + 1);
      ioReqCount := length(str);
    end;
{set async to always false to test serial cards.  CB }
  WriteOut := PBWrite(@serBlock.SerialOut, sync);

  for i := 1 to wait do
    begin
      x := x * 2;
    end;

  if false then
    Announce(StringOf('WriteOut: "', str, '" to ', serBlock.outFname, ', async = ', sync));
end;

function WriteOutBuff (var serBlock: serBlockRec; theData: Ptr; count: longint; sync: boolean): integer;
  var
    i, x: integer;
begin  { write this string out to the glove box, no questions asked. }
  with serBlock.SerialOut do
    begin
      ioBuffer := theData;
      ioReqCount := count;
    end;
  WriteOutBuff := PBWrite(@serBlock.SerialOut, sync);
end;


function readIn (var serBlock: serBlockRec; buffPtr: ptr; count: longint; synch: boolean): integer;
```

-000578

```
  var
    x, i: integer;
 begin
  with serBlock.SerialIn do
   begin
    ioBuffer := buffPtr;
    ioReqCount := count;
   end;

  readIn := PBRead(@serBlock.SerialIn, synch);

  if not synch then
   for x := 1 to 1000 do
    begin
     i := i + 1
    end;
 end;

 procedure disablePort (portNum: integer);
  { Mark this portNum(1..32) as unavailable by clearing it's bit in currentPorts. }
 begin
  currentPorts := currentPorts - [portNum];
 end;

 procedure EnablePort (portNum: integer);
  { Mark this portNum(1..32) as available by clearing it's bit in currentPorts. }
 begin
  currentPorts := currentPorts + [portNum];
 end;

 function isPortAvail (portNum: integer): Boolean;
 begin
  isPortAvail := portNum in currentPorts;
 end;

 function UserPortName (refer: integer): string;
  { Return a string which is the name of the given portNum(1..32). }
 begin
  case refer of
   1:
    UserPortName := 'Modem port';
   2:
    UserPortName := 'Printer port';
   3, 4, 5, 6:
    UserPortName := concat('Creative Solutions port ', chr(64 + refer));
   7, 8, 9, 10:
    UserPortName := concat('SuperMac port ', chr(60 + refer));
   otherwise
    UserPortName := stringof('way out port ', refer);
  end;
 end;

 procedure AliveAndWell (name, port: string);
```

-000579

```
    { What can I say, a total waste of time and space. CLB }
  var
    i: integer;
    str: string;
begin
  i := Random mod 100;
  case i of
    0..49:
      str := ' alive and well on ';
    50..59:
      str := ' alive and loaded for bear on ';
    60..69:
      str := ' alive but feeling nasty on ';
    70..79:
      str := ' alive, happy and ready to party on ';
    80..89:
      str := ' half dead but willing to work on ';
    90..99:
      str := ' alive and ready to greet the day on ';
    otherwise
      str := ' neither dead nor alive on ';
  end;
  Announce(concat(name, str, port));
end;

function openADriver;        {baud: integer;  var  SerBlock : serBlockRec; }
  var
    err: array[1..4] of integer;
    flags: SerShk;
    x: integer;
begin

  err[2] := openDriver(serBlock.outFname, SerBlock.SerialOut.ioFRefNum);

  err[1] := 0;
  for x := 1 to 25 do
    begin
    end;

  err[1] := openDriver(serBlock.inFname, SerBlock.SerialIn.ioFRefNum);

  for x := 1 to 25 do
    begin
    end;

  { if using RAM drivers, open them here.  You can only use ports A and B, however}
{NOTE:  don't bother resetting them if they have errored when trying to open.}
{this can only lead to problems.  SB 6.28.89}

  if ((err[1] + err[2]) = 0) then
    err[3] := SerReset(SerBlock.SerialIn.ioFRefNum, baud);
  for x := 1 to 25 do
    begin
```

-000580

```
    end;

  if ((err[1] + err[2] + err[3]) = 0) then
    err[4] := SerReset(SerBlock.SerialOut.ioFRefNum, baud);
  for x := 1 to 25 do
    begin
    end;

  if err[1] + err[2] + err[3] + err[4] = 0 then
    begin
      openADriver := true;
      ZeroMem(@flags, sizeof(flags));
      if HardShake then
        flags.fXOn := 255;

      err[3] := SerHShake(SerBlock.SerialIn.ioFRefNum, flags);
      err[4] := SerHShake(SerBlock.SerialOut.ioFRefNum, flags);

    end
  else
    begin
      reportIOErrors(err[1], err[2], err[3], err[4], whom);
      openADriver := false;
    end;
end;

procedure reportIOErrors;
  var
    str, str2: str255;
    aChar, x: integer;

  procedure errorType (errNo: integer; var name: str255);
  begin
    case errNo of
      -21:
        name := 'referencing an incorrectly initialized port';
      -43:
        name := 'searching for a non-existant port (is SuperMac software installed?)';
      -98:
        name := 'not configured correctly (try turning Appletalk off)';
      -97:
        name := 'trying to use a port that is already in use';
      otherwise
        name := 'having an undefined problem';
    end;
  end;

begin

  portError := 1;

  if (err1 <> 0) then
    errorType(err1, str)
```

-000581

```
  else if (err2 <> 0) then
    errorType(err2, str)
  else
    str := 'having an undefined problem';

  case currentPortNum of
    1:
      announceB('Error on the modem port...');
    2:
      announceB('Error on the printer port...');
    3..6:
      announceB('Error on the Creative Solutions card...');
    7..10:
      announceB('Error on the SuperMac card...');
    otherwise
      announceB('Error on some wierd port...');
  end;

  if false then
    str := stringof(str2, ' errors: ', err1, ' ', err2, ' ', err3, ' ', err4);

  Announce(stringof('... it is ', str));

  DisablePort(currentPortNum);
end;

procedure setUpSerialRec;    { (var SerBlock: serBlockRec); }
begin
  ZeroMem(@SerBlock.SerialIn, sizeof(ParamBlockRec));
  with SerBlock.SerialIn do
    begin
      ioNamePtr := @SerBlock.inFname;
      ioBuffer := nil;
      ioCompletion := nil;
    end;
  ZeroMem(@SerBlock.SerialOut, sizeof(ParamBlockRec));
  with SerBlock.SerialOut do
    begin
      ioNamePtr := @SerBlock.outFname;
      ioBuffer := nil;
      ioCompletion := nil;
    end;
end;


function DriverPortName (thePortNum: integer; inName: Boolean): string;
begin
  if thePortNum < 7 then
    begin
      if inName then
        DriverPortName := concat('.', chr(64 + thePortNum), 'In')
      else
        DriverPortName := concat('.', chr(64 + thePortNum), 'Out');
```

-000582

```
    end
  else
    begin
      if inName then
        DriverPortName := concat('.CommCardIn', superSlot, chr(41 + thePortNum))
      else
        DriverPortName := concat('.CommCardOut', superSlot, chr(41 + thePortNum));
    end;
end;

procedure setUpPort; { (thePortNum: integer; var serBlock: serBlockRec)}
begin
  if thePortNum < 7 then
    begin
      serBlock.inFname := concat('.', chr(64 + thePortNum), 'In');
      serBlock.outFname := concat('.', chr(64 + thePortNum), 'Out');
    end
  else
    begin
{NOTE:  superSlot is determined in isSMCardReallyThere, above}
      serBlock.inFname := concat('.CommCardIn', superSlot, chr(41 + thePortNum));
      serBlock.outFname := concat('.CommCardOut', superSlot, chr(41 + thePortNum));
    end;
end;

{serBlock.inFname := concat('.', chr(64 + thePortNum), 'In');}
{serBlock.outFname := concat('.', chr(64 + thePortNum), 'Out');}
   {For RAM drivers, you must do set sPortSel, but you can only do this for ports A and B}


procedure closeSerial;  { (var SerBlock) }
  var
    err: integer;
begin
  SerBlock.SerialIn.ioCompletion := nil;
  SerBlock.SerialOut.ioCompletion := nil;
  err := PBKillIO(@SerBlock.SerialIn, false);
  err := PBKillIO(@SerBlock.SerialOut, false);     { !!! this line crashes when hooked to an IBM and
      useModem = true. }
  ClearInBuff(SerBlock.serialIn);

  {note: if and when RAM serial drivers are used, add code for RAMDSclose for each of the ports}
end;


procedure clearInBuff;  { (var SerIn : ParamBlockRec) }
{ Clear the input buffer. }
  var
    count, tic: longInt;
    err: integer;
begin
  SerIn.ioCompletion := nil;
  err := PBKillIO(@SerIn, false);
```

-000583

```
    tic := Ticks^;
    repeat  { wait 1/2 a sec }
    until (Ticks^ > (tic + 30));

{ empty the input buffer one byte at a time. }
    err := SerGetBuf(SerIn.ioFRefNum, count);
    while (count <> 0) and (err = 0) do
      begin
        SerIn.ioReqCount := 1;
        err := PBRead(@serIn, false);
        err := SerGetBuf(serIn.ioFRefNum, count);
      end;
  end;

{ Code to handle a popup menu of available serial port names. }

  procedure MakePortNamesMenu;
    var
      i, j: integer;
  begin
    i := CountMItems(tempPopMenu);
    for j := 1 to i do
      DelMenuItem(tempPopMenu, 1);

    for i := 1 to 16 do
      begin
        AppendMenu(tempPopMenu, UserPortName(i));
        if not isPortAvail(i) then
          DisableItem(tempPopMenu, i);
      end;
  end;

  function popUpPortNames (topLeft: point; lastOne: integer): integer;
      { popUpDMTypes brings up the PortName popup menu.   It returns the menu item, which}
      { corresponds to the item. }
    var
      menuResult: longInt;
      validPop: integer;
  begin
    MakePortNamesMenu;
    LocaltoGlobal(topLeft);
    menuResult := PopUpMenuSelect(tempPopMenu, topLeft.v + 3, topLeft.h + 3, lastOne);
    if LoWord(menuResult) = 0 then
      validPop := lastOne
    else
      validPop := LoWord(menuResult);
    popUpPortNames := validPop;
  end;

end.
```

```
unit serialTypes;

interface

  uses
    Globals;

{ these are the new global variables required to manage a various serial configurations }

{ CLB 2/90 - Changed currentPorts into a set of PortType (1..32).  PortA-PortJ are now 1..10, elements in
      the set. }

{ The compiler variable newPortType reflects the change.  Setting it to false will use the old way. }
{$setc newPortType = true }

  const

    { Names for the available port numbers. }
    portA = 1;          { modem port }
    portB = 2;        { printer port }
    portC = 3;        { C..F = Creative Solutions card. }
    portD = 4;
    portE = 5;
    portF = 6;
    portG = 7;        { G..J = SuperMac card. }
    portH = 8;
    portI = 9;
    portJ = 10;

    testFailed = -1;
    testSuccess = 1;

    polhemusID = 1;
    gloveBoxID = 2;
    isotrakID = 4;

    totalMaxGBoxes = 6;   {maximum conceivable amounts of these input devices}
    totalMaxPolhms = 6;
    totalMaxIsotraks = 6;

    maxsensize = 32;          {for gloves}
    maxpolsize = 100;         {for polhemus}
  type

    PortType = 1..32;          { PortType is the range of available serial ports. }
    PortSet = set of PortType;

    sensize = 1..maxsensize;
    polsize = 1..maxpolsize;
    polhemusBox = (isotrak, Space3);

    serBlockPtr = ^serBlockRec;
    serBlockRec = record
```

-000585

```
    dar: DARec;
    inFname: string[20];
    outFname: string[20];
      { These vars are here so the ioCompletion routine can find them based on A0 = ParamBlockRec }
    interruptBuff: packed array[polsize] of char;
    rFlag: Integer;
    readCount: longInt;
    GlobBuff: Ptr;
    SerialIn: ParamBlockRec;
    SerialOut: ParamBlockRec;
    reqCount: integer;
  end;

  polhmSerPtr = ^polhmSerialBlock;
  polhmSerialBlock = record
    serBlock: serBlockRec;
    found: Boolean;
    inSerBuff: packed array[polsize] of char;
    inChars: packed array[polsize] of char;
    raw: packed array[polsize] of char;
    lastResponse: longint;
    ssPairs: integer;          {1 for isotrak, variable for 3space }
    whatAmI: polhemusBox;      {either 3space or isotrak}
    readSize, recordSize: integer;     {readSize=ssPairs *12, record size = ssPairs*15}
    sendBytes: string[10];
    myPort: integer;
  end;

  gloveSerPtr = ^gloveBoxBlock;
  gloveBoxBlock = record
    serBlock: serBlockRec;
    found: Boolean;
    inChars: packed array[sensize] of char;
    raw: array[sensize] of char;
    lastResponse: longint;
    sendBytes: string[10];
    failed: integer;           { How many times the communication has failed. }
    myPort: integer;
  end;

var
  gOneShot: Boolean;         { True if sending OneShots to the glove. }
  pOneShot: Boolean;         { True if sending OneShots to the polhemus (have to do 7 bit decoding for
     that). }
  currentPorts: PortSet;     { Set of the available ports. }
  portError: integer;
  currentPortNum: integer;   {for error messages}

  numGloves, numPolhms: integer;
  gBoxes: array[1..totalMaxGBoxes] of gloveSerPtr;
  polhms: array[1..totalMaxPolhms] of polhmSerPtr;

  superSlot: string[3];
```

-000586

```
    gloveBaudR, polhmBaudR: integer;

implementation
end.
```

```
{   SGICom.pas - communicate over the ethernet to 1 to 4 SGI's sending the current tree to them. }
{   © VPL Research, Inc.  Chuck Blanchard 4/29/89 }

{   This actually calls C code to do the ethernet packet sending and recieving. }
{   It handles the high-level packet making and communication protocall. }

unit SGICom;

interface


  uses
    CompileTime, AutoLib, ChuckStuff, FastStuff, Globals, Tree3DGlob, MiscRoutines, MacADIOSutils,{}
    macADIOSDAcq, formTree3D, Tree3D, DMTypes, DMGlobals, DMFileIO, EtherGlue, SGImisc;

{$ifc for_SGIs  }

  procedure InitSGI;          { Called at the beginning of the program. }
  procedure CheckSGI;     { Called once through the BE main loop.  Don't waste time in here. }
  procedure rehookupSGI; { Called when a rehookup message is brodcasted. }
  procedure CloseSGI;     { Called when the program ends. }
  procedure NeedNewIsaac;

    { These routines declared global so DataMassage can find them. }
  procedure doOccDM (var dm: DMRec);
  procedure HandleOccDM (v: DMVerb; var dm: DMRec);
  procedure doIAttribDM (var dm: DMRec);
  procedure doAtribIndexDM (var dm: DMRec);
  procedure HandleIAttribDM (v: DMVerb; var dm: DMRec);


{$endc }

implementation

{$ifc for_SGIs  }

  const
    ALL_SGI = -1;                       { Ethernet Broadcast address. }
    MACCode = 100;                  { number for mac packet who. }
    MAX_PACKET = 1400;              { Maximum size of packet that can be sent in one UDP. }
    WRITE_SIZE = 1024 * 4;          { Size of the buffer the world is being written into. }
    READ_SIZE = 100;                { Size of the scratch buffer to read into. }
    HALF_READ = READ_SIZE div 2;
    Timeout = 60 * 2;               { Num of jiffies before the mac say's the SGI's timed out. }
    blab = false;


    DIG_IN_BIT = $80;
    DIG_OUT_BIT = $80;
```

-000588

```
{ constant offsets for packet header stuff into an array 1..x of integer. }
   PAC_LEN = 1;
   PAC_OP = 2;
   PAC_WHO = 3;
   PAC_HEADSIZE = 6;
   AFTER_HEAD = 4;

   ERR_op = $ffff;              { mac <-> SGI Ethernet packet opcodes. }
   OK_op = 1;
   SendTree_op = 2;
   FullTree_op = 3;
   Change_op = 4;
   WakeUp_op = 5;               { Wake up call brodcast to all SGI's.  They should just return OK. }
   Quit_op = 6;
   View_op = 7;                 { Specifies which node, eye and default offset the sgi is. }
   Eye_op = 8;
   EyeDone_op = 9;
   Load_op = 10;
   SetNTSC_op = 11;
   SetRGB_op = 12;
   PutFile_op = 13;
   ChangeAttr_op = 14;

  type

   { Header that is at the beginning of all Packets sent and recieved. }
   PacketHeader = record
      len,                 { length in bytes of the packet. }
      opcode,              { Type of packet it is. }
      who:  integer;    { who the packet is addressed to; -1 = all SGI, 0..x = SGI # x,  MACCode = mac. }
    end;

   IntAr = array[1..3200] of integer;
   IntArPtr = ^IntAr;

   { structures used for setting/clearing isaac attributes. }
   Long2 = array[0..1] of LongInt;
   Long2Ptr = ^Long2;
   Long4 = array[0..3] of LongInt;
   Long4Ptr = ^Long4;
   chgAttribRec = record
      nodeNum: integer;
      onoff: Long2;
    end;
   chgAttribPtr = ^chgAttribRec;


  var
   SGIon,                      { True if sending records to the SGI's. }
   SGIconnect: boolean;        { True if ethertalk opened to the SGI's. }
   NTSCmode: Boolean;          { True if the mac thinks the monitors are sending NTSC. }
   ConnectDy,                  { Dynamic menu item for Connect to SGI }
```

-000589

```
  SendDy: integer;              { Dynamic menu item for Send to SGI }
  NTSCdy: integer;              { Dynamic menu item for Set NTSC item. }
  SGIreply: integer;            { Bit set for each SGI the mac is expecting a reply from. }
  Reply: array[1..MaxSGIs] of integer;   { How many replies are expected from each SGI. }
  WriteBuffPtr: IntArPtr;       { Pointer to area the write buffer is written into. }
  WriteCount: longInt;          { Number of bytes in the write buffer. }
  NextTimeout: longInt;         { Next Tick count the communication times out on. }
  sendAfter: longInt;           { don't send another packet until after this time. }
  UDPInfo: UDP_Info;            { All the info needed to do Ethernet UDP stuff. }
  ReadBuff: array[1..HALF_READ] of integer;
  StartDy, EndDy: integer;      { Start and end of the Dynamic Items that are turned on/off when
     connecting. }
  doingAuto: Boolean;           { True if auto to the SGI's }
  AutoDy: integer;              { dynamic menu item for AutoIsaac }
  globAtrib: Long4;

function Keypress: boolean;
  var   { Return true if a key is in the buffer. }
    event: EventRecord;
    bool: boolean;
begin
  Keypress := EventAvail(keyDownMask, Event);
end;

procedure Jsleep (jif: integer);
  { Sleep for the requested number of jiffy counts.   }
  var
    t: longInt;
begin
  if false then
    begin
      Announce(StringOf('Jsleep ', jif : 1, ' jiffies.'));
      t := Ticks^ + jif;
      repeat
      until Ticks^ > t;
    end;
end;

procedure PtoCstr (var str: string);
  { Change str from a pascal string to a C string. }
  var
    charPtr: charsPtr;
    j, len: integer;
begin
  len := length(str);
  charPtr := CharsPtr(@str);
  for j := 1 to len do
    charPtr^[j - 1] := charPtr^[j];
  charPtr^[len] := chr(0);
end;

{ Pending replies from the SGI's are reflected in the i'th bit of SGIreply and in the }
{ i'th entry of the Reply array.  If the bit is set the mac is waiting for a reply, }
```

-000590

```
{ Reply[i] has a count for how many replies are expected. }
  procedure ClearReply (who: longInt);
    { Decrement the number of replies the mac is waiting for from this SGI.  If count goes to zero then }
    { clear the reply bit for the SGI with the given address.  That means the mac isn't waiting for }
    { a reply from this SGI. }
    var
      i: integer;
  begin
    for i := 1 to NumOfSGI do
      if SGI_Info[i].addr = who then
        begin
          if Reply[i] > 0 then
            Reply[i] := Reply[i] - 1;
          if Reply[i] = 0 then
            BitClr(@SGIreply, i);
          leave;
        end;
  end;

  procedure SetReply (idx: integer);
    { Increment the number of replies expected from the idx'th numbered SGI in the internal array. }
  begin
    Reply[idx] := Reply[idx] + 1;
    BitSet(@SGIreply, idx);
  end;
  procedure SetAllReplies;
    {.Set all the SGI currently on to expect another reply }
    var
      i: integer;
  begin
    for i := 1 to NumOfSGI do           { pending for all the SGI's out there. }
      with SGI_Info[i] do
        if on then
          begin
            SetReply(i);
          end;
  end;

  function WaitingForReply (idx: integer): Boolean;
{ Return true if the mac is waiting for a reply from this SGI. }
  begin
    WaitingForReply := (Reply[idx] <> 0);
  end;

  function WaitForReply (addr: longint; maxtime: integer): boolean;
    { Wait for a reply from the SGI with the given address. }
    { Return true if got a reply, false if timed out. }
    var
      t, count, whoAddr: longInt;
      here, replied: boolean;
      err: integer;
  begin
    replied := false;
```

-000591

```
  t := Ticks^ + maxtime;
  repeat
    err := EtherReadHere(UDPInfo, here);
    if here then
      begin
        count := READ_SIZE;  { max buffer size }
        err := EtherRead(UDPInfo, @ReadBuff, count, whoAddr, false);      { for now block on a read. }

        if (count <> 0) and (err = noErr) then
          begin
            if count <> ReadBuff[1] then
              begin
                announce(StringOf('Got an invalid packet size from SGI #', EthAddrtoStr(whoAddr) : 1, ',
      count = ', count : 1, ', packet[1] = ', ReadBuff[1] : 1, '.'));
              end
            else if (err = noERR) and (count >= 4) then
              case ReadBuff[PAC_OP] of
                ERR_op:
                  begin
                    announce(StringOf('Got an error packet from SGI ', EthAddrtoStr(whoAddr), ', count = ',
      count : 1, '.'));
                    ClearReply(whoAddr);
                    leave;
                  end;
                OK_op:     { SGI sent an OK, just clear the reply pending bit for this SGI. }
                  begin
                    ClearReply(whoAddr);
                    replied := (whoAddr = addr);
                  end;
                otherwise
                  ;
              end;
          end;
      end;
  until replied or (t < Ticks^);
  WaitForReply := replied;
end;

procedure ClearAllReplies;
  var
    i: integer;
begin
  for i := 1 to MaxSGIs do
    Reply[i] := 0;
  SGIreply := 0;
end;

function GotHardReply: boolean;
  { Return true if the sgi's have all sent the hardsync reply. }
begin
  GotHardReply := (BAND(adios_regs^.DigInAddr^, DIG_IN_BIT) <> 0);
end;
```

–000592

```
procedure ClearHardReply;
  { Clear the HardSync bit so GotHardReply would return true. }
begin
end;

procedure SetHardReply;
  { Set the HardSync bit so GotHardReply will return false until the sgi's all reply that they're done. }
begin
  writeDig(0, DIG_OUT_BIT);
  writeDig(DIG_OUT_BIT, DIG_OUT_BIT);
end;

function WaitForAllReplies: boolean;
  { Return true if all the SGI's replied within 5 seconds. }
  const
    waitSec = 5 * 60;
  var
    i: integer;
    b: Boolean;
    t: LongInt;
begin
  t := Ticks^ + waitSec;
  b := true;
  repeat
    for i := 1 to MaxSGIs do
      if WaitingForReply(i) then
        begin
          b := WaitForReply(SGI_Info[i].addr, waitSec) and b;
          leave;
        end;
  until (Ticks^ > t) or (SGIreply = 0);
  b := (SGIreply = 0) and b;
  if SGIreply <> 0 then
    begin
      for i := 1 to NumOfSGI do
        if BitTst(@SGIreply, i) then
          AnnounceB(StringOf('SGI # ', i : 1, ' hasn''t responded in ', waitSec / 60 : 2 : 2, ' seconds.'));
      ClearAllReplies;
    end;
  WaitForAllReplies := b;
end;

function NumFromWho (who: longInt): integer;
  { Given an Ethernet address, return an index 1..x for the SGI that it is. Return -1 if not found. }
  var
    i: integer;
begin
  NumFromWho := -1;
  for i := 1 to NumOfSGI do
    if SGI_Info[i].addr = who then
      begin
        NumFromWho := i;
        leave;
```

-000593

```
      end;
  end;

  function AskUserWhichSGI (pair: boolean): integer;
    { Ask the user which SGI to specify.  Return the array index 1..x for which one. }
    { Return -1 if the user didn't specify a valid SGI. }
{if pair = true then returns pair number, else returns individual SGI}
    const
      sgiBoxID = 2023;
      oneItem = 4;
      twoItem = 5;
      threeItem = 6;
      fourItem = 7;
    var
      sgiBox: dialogPtr;
      oldPort: grafPtr;
      which, nodeNum: integer;
      str: Str255;
      itemHit: integer;
      lastItem: integer;
  begin
    AskUserWhichSGI := -1;
    if not SGIConnect then
      exit(AskUserWhichSGI);

    getPort(oldPort);
    sgiBox := getNewDialog(sgiBoxID, nil, pointer(-1));
    setPort(sgiBox);

    lastItem := oneItem;
    radioOn(sgiBox, oneItem, true);

    if pair then
      paramText('Which pair of SGIs?', '', '', '')
    else
      paramText('Which SGI?', '', '', '');
    if pair then
      begin
        radioOn(sgiBox, threeItem, false);
        radioOn(sgiBox, fourItem, false);
      end;
    positionwindow(sgiBox, 50, 30);
    ShowWindow(sgiBox);

    repeat
      modalDialog(nil, itemHit);
      if (itemHit > oneItem - 1) and (itemHit < fourItem + 1) then
        begin
          radioOn(sgiBox, lastItem, false);
          radioOn(sgiBox, itemHit, true);
          lastItem := itemHit;
        end;
    until (itemHit = 1) or (itemHit = 2);
```

```
  if itemHit = 1 then
    begin
      AskUserWhichSGI := (lastItem - oneItem) + 1;

    end
  else
    AskUserWhichSGI := -1;
  disposDialog(sgiBox);
  setPort(oldPort);

end;

function SendSimple (op: integer; whoAddr: LongInt): integer;
  var
    SendCount: longInt;
    i, err: integer;
    packet: PacketHeader;
begin
  i := NumFromWho(whoAddr);
  with packet do
    begin
      len := sizeof(packet);
      opcode := op;
      if i <= 0 then
        who := $FFFF
      else
        who := SGI_Info[i].whoBit;
      SendCount := len;
    end;
  err := EtherWrite(UDPInfo, Ptr(@packet), SendCount, whoAddr, false);
  SendSimple := err;
end;

procedure SendViewPacket (sginum, ox, oy: integer; NodeName: NameStr);
  { Send the SGI the current view information. }
  var
    i, err: integer;
    SendCount: longInt;
    viewPacket: record
        head: PacketHeader;
        occX, occY: integer;
        right: integer;
        name: NameStr;
      end;
begin
  with viewPacket do
    begin
      head.len := sizeof(viewPacket);
      head.opcode := View_op;
      head.who := SGI_Info[sginum].whoBit;
      occX := ox;
      occY := oy;
      right := ord(SGI_Info[sginum].RightEye);
```

```
      name := NodeName;
      PtoCstr(name);
      SendCount := head.len;
    end;
   err := EtherWrite(UDPInfo, Ptr(@viewPacket), SendCount, SGI_Info[sginum].addr, false);
   SetReply(sginum);
  end;

  procedure SendFullTree (sginum: integer);
{ Send the full description of the tree to this SGI.  Don't worry about how long it takes, }
{ don't wait for the OK reply back from the SGI, just set SGIreply to say you are expecting a reply. }
   const
    buffSize = 8 * 1024;
   type
    nodeDescType = record
       macNum: integer;
       name: nameStr;
       upIdx, downIdx, rightIdx, rbIdx: integer;
       pos: SixType;
       flags: flagSet;
     end;
    nodeDescPtr = ^nodeDescType;
   var
    tempPtr: IntArPtr;
    scratch: array[1..5] of integer;
    err, sendMax, sendStart, sendEnd: integer;
    SendCount, whoAddr: longInt;
    deallocate: boolean;

   function writeOutNodes (startIdx, endIdx: integer): integer;
   { Write a description of all the nodes in the current tree to the buffer pointed to by tempPtr. }
   { CLB 4/30/89 - This routine was just lifted from SaveMassaged and modified to }
   { write to a buffer, not a file. }
    var
     i, j, err: integer;
     nptr: nodeDescPtr;
     { nodeMap describes the mapping of storage -> RecordedTree }
     nodeMap: array[1..maxStorage] of integer;
     charPtr: CharsPtr;

    function NodeIdx (p: PRecPtr): integer;
    begin
     if p = nil then
      NodeIdx := 0
     else
      NodeIdx := PtrtoL(mainTreePtr, p);      { Changed to send the Storage index - CLB }
    end;
   begin { writeoutNodes }
    err := noErr;
    for i := 1 to maxStorage do     { Initialize all nodeMap to unused. }
     nodeMap[i] := -1;
    for i := 1 to RecNodeNum do          { for each node in RecordedTree }
     nodeMap[RecTreePtr^[i].idx] := i;    { figure out its map to storage. }
```

-000596

```
for i := startIdx to endIdx do
  if mainTreePtr^.storage[RecTreePtr^[i].idx] <> nil then
    with mainTreePtr^.storage[RecTreePtr^[i].idx]^ do
      begin
        if SendCount + sizeof(nodeDescType) > buffSize then
          begin
            Announce('SendFullTree: Ran out of buffer space');
            err := memFullErr;
            leave;
          end;
        nptr := nodeDescPtr(ord4(tempPtr) + SendCount);
        SendCount := SendCount + sizeof(nodeDescType);
        SGIDirty := false;
        nptr^.macNum := RecTreePtr^[i].idx;{ Changed to send the Storage index - CLB }
        charPtr := CharsPtr(@nptr^.name);      { Make a C string out of name and put it in nptr^.name }
        for j := 1 to length(name) do
          charPtr^[j - 1] := name[j];
        charPtr^[length(name)] := chr(0);
        nptr^.upIdx := NodeIdx(up);
        nptr^.downIdx := NodeIdx(down);
        nptr^.rightIdx := NodeIdx(right);
        nptr^.rbIdx := NodeIdx(rBandptr);
        nptr^.pos := ISix;
        nptr^.pos.pt.y := -nptr^.pos.pt.y;          { Flip some of the transformations for young }
        nptr^.pos.pt.z := -nptr^.pos.pt.z;
        nptr^.pos.tt.roll := -nptr^.pos.tt.roll;
        nptr^.flags := flags - [Dline, Rline];
        if IDown then
          nptr^.flags := [Dline];
        if IRight then
          nptr^.flags := nptr^.flags + [Rline];
        if name = 'Head' then
          begin
          end;
      end;
  writeoutnodes := err;
end;

begin
  Announce('CheckSGI:  sending Tree.');
  tempPtr := IntArPtr(NewPtr(buffSize));
  if tempPtr = nil then
    begin
      Announce('SendFullTree: NewPtr failed.');
      err := memFullErr;
      deallocate := false;
    end
  else
    begin
      deallocate := true;
      MakeRecordTree(false, false);
      tempPtr^[PAC_OP] := FullTree_op;
      tempPtr^[PAC_WHO] := SGI_Info[sginum].whoBit;
```

-000597

```
      SendCount := PAC_HEADSIZE + 2;
      { sendMax is the max number of node descriptions that can be sent in one packet. }
      sendMax := (MAX_PACKET - PAC_HEADSIZE) div sizeof(nodeDescType);
{   sendMax := 40; }
      Announce(StringOf('One packet holds ', sendMax : 1, ' nodes.'));
      sendStart := 1;
      repeat
        SendCount := PAC_HEADSIZE + 2;
        sendEnd := MinOf(RecNodeNum, sendStart + sendMax);
        Announce(StringOf('SendFullTree: Sending nodes ', sendStart : 1, ' to ', sendEnd : 1, ''));
        err := writeOutNodes(sendStart, sendEnd);
        tempPtr^[AFTER_HEAD] := sendEnd - sendStart + 1;
        tempPtr^[PAC_LEN] := sendCount;   { byte count in packet }
        err := EtherWrite(UDPInfo, Ptr(tempPtr), SendCount, SGI_Info[sginum].addr, false);
        SetReply(sginum);
        if not WaitForReply(SGI_Info[sginum].addr, 5 * 60) then
          leave;
        sendStart := sendEnd + 1;
      until (sendStart > RecNodeNum) or (err <> noErr);
    end;
  if err <> noErr then
    begin   { Got an error on something, send error packet to SGI }
      Announce(StringOf('SendFullTree: got an error #', err : 1));
    end;
  if deallocate then
    begin
      DisposPtr(Ptr(tempPtr));
    end;
  if not WaitForAllReplies then
    ;
end; { SendFullTree }

procedure ReconfigSGIs;
  var
    i, err: integer;
begin
  for i := 1 to NumOfSGI do
    with SGI_Info[i] do
      if on then
        begin
          SendFullTree(i);
        end;
  if not (ADIOSbit in DAconfig.bits) then          { If macAdios isn't connected then }
    doHardReply := false;                          {  make sure doHardReply is false. }
  if doHardReply then
    ClearHardReply;
  NextTimeout := Ticks^ + Timeout;
  sendAfter := Ticks^;
end;

  { Brodcast the current tree pos to all the SGI currently installed. }
procedure BroadcastNew;
  var
```

-000538

```
   i, err: integer;
   adios: integer;

 procedure BuildNewBuff;
   { Build a new buffer of all the changed nodes since the last time a buffer was made. }
   { Buffer has the form: }
   { Length; Change_op; ChangeNodeType, ChangeNodeType... }
   { RecTreePtr^[1..RecNodeNum] has a list of all the nodes currently being used. }
  type
     { ChangeNodeType is the record that is send for each node that has changed. }
    ChangeNodeType = record
       index: integer;
       newPos: SixType;
     end;
    ChangeNodePtr = ^ChangeNodeType;

  var
    i, idx: integer;
    wptr: ptrsType;
    cn: ChangeNodePtr;
 begin
  WriteBuffPtr^[PAC_LEN] := 0;
  WriteBuffPtr^[PAC_OP] := Change_op;
  WriteBuffPtr^[PAC_WHO] := ALL_SGI;
  wptr.l := ord4(WriteBuffPtr) + PAC_HEADSIZE;
  for i := 1 to RecNodeNum do
    begin
      idx := RecTreePtr^[i].idx;
      if mainTreePtr^.storage[idx] <> nil then
        with mainTreePtr^.storage[idx]^ do
          if SGIdirty then
            begin
              cn := ChangeNodePtr(wptr.lp);
              wptr.l := wptr.l + sizeof(ChangeNodeType);
              cn^.index := idx;                         { Changed to send the Storage index - CLB
    }
              cn^.newPos := lSix;
              cn^.newPos.pt.y := -cn^.newPos.pt.y;     { flip transformations for young. }
              cn^.newPos.pt.z := -cn^.newPos.pt.z;
              cn^.newPos.tt.roll := -cn^.newPos.tt.roll;
              SGIdirty := false;
              if name = 'Head' then
                begin
                end;
            end;
    end;
   WriteCount := wptr.l - ord4(WriteBuffPtr);
   WriteBuffPtr^[PAC_LEN] := WriteCount;
 end;

begin
 BuildNewBuff;
 if WriteCount > PAC_HEADSIZE then
```

```
    begin
      if syncOnChange then
        sendAfter := Ticks^
      else
        sendAfter := Ticks^ + NoSyncMin;
      OutCountPtr^ := OutCountPtr^ + 1;     { Increment the output counter }
      if doHardReply then
        SetHardReply
      else if syncOnChange then             { else if doing ethernet sync then set reply }
        for i := 1 to NumOfSGI do           { pending for all the SGI's out there. }
          with SGI_Info[i] do
            if on then
              begin
                SetReply(i);
              end;
      if WriteCount > MAX_PACKET then
        begin
          Announce(StringOf('Isaac BroadcastNew: UDP packet too big, sending entire tree.  ', WriteCount :
       1));
          ReconfigSGIs;
        end
      else
        err := EtherWrite(UDPInfo, Ptr(WriteBuffPtr), WriteCount, ALL_SGI, false);
    end;
end;

procedure WakeUpSGIs;
  var
    i, err, need: integer;
    t, whoAddr, count: LongInt;
    here: Boolean;
begin
  err := SendSimple(WakeUp_op, ALL_SGI);    { Brodcast a wakeup call to all SGI's. }
  ClearAllReplies;                              { reply turn it off, else reset it. }
  need := 0;
  for i := 1 to NumOfSGI do
    with SGI_Info[i] do
      begin
        whoBit := BitShift(1, i - 1);
        on := (addr <> 0);
        if on then
          begin
            SetReply(i);
            need := need + 1;
          end;
      end;
  t := Ticks^ + 60 * 3;                    { Wait for 3 second to let the SGI's reply.  If an SGI doesn't }
  repeat
    err := EtherReadHere(UDPInfo, here);
    if here then
      begin
        count := READ_SIZE;  { max buffer size }
        err := EtherRead(UDPInfo, @ReadBuff, count, whoAddr, false);
```

```
      i := NumFromWho(whoAddr);
      if i <= 0 then
        AnnounceB(StringOf('Got reply from unknown Address ', EthAddrtoStr(whoAddr)))
      else if (ReadBuff[PAC_LEN] = PAC_HEADSIZE) and (ReadBuff[PAC_OP] = OK_op) then
        begin
          need := need - 1;
          Announce(StringOf('Got reply from Address ', EthAddrtoStr(whoAddr), ' SGI #', i : 1));
          ClearReply(whoAddr);
        end;
    end;
  until (t < Ticks^) or (need = 0);
  for i := 1 to NumOfSGI do
    if WaitingForReply(i) then
      begin
        AnnounceB(StringOf('No response from Address ', EthAddrtoStr(SGI_Info[i].addr), '. #', i : 1, '
       turned off.'));
        SGI_Info[i].on := false;
      end;
  SGIconnect := true;
  ClearAllReplies;
end;

  { A rehookup message has been brodcasted. The tree has been edited. If we are currently }
  { sending to the SGI's then send the new state of the tree. }
procedure rehookupSGI;
begin
  if SGIconnect and SGIon then
    begin
      MakeRecordTree(false, false);      { Record the state of the BE tree. }
      ReconfigSGIs;         { And send a new tree to all the SGI's. }
    end;
end;

  { CheckSGI is called once through the BE main loop. If currently sending to the SGI's then do all the }
  { sending/recieving. First see if there are any replies from the SGI's. If so handle them. }
  { Then, if not expecting anymore replies then brodcast a new change record. }
procedure CheckSGI;
  var
    i, err: integer;
    count, whoAddr: longInt;
    here, doit: Boolean;

begin
  if not SGIconnect then
    exit(CheckSGI);

  err := EtherReadHere(UDPInfo, here);      { Any packets here yet? }
  if here then
    begin                          { Yes, deal with them. }
      count := READ_SIZE; { max buffer size }
      err := EtherRead(UDPInfo, @ReadBuff, count, whoAddr, false);
      if err = commandTimeout then
        begin
```

```
            sysbeep(3);
          end;
        if (count <> 0) and (err = noErr) then
          begin
            if count <> ReadBuff[1] then
              begin
                announce(StringOf('Got an invalid packet size from SGI ', EthAddrToStr(whoAddr), ', count =
        ', count : 1, ', packet[1] = ', ReadBuff[1] : 1, '.'));
              end
            else if (err = noERR) and (count >= 4) then
              case ReadBuff[PAC_OP] of
                ERR_op:
                  begin
                    announce(StringOf('Got an error packet from SGI ', EthAddrToStr(whoAddr), ', count = ',
        count : 1, '.'));
                    ClearReply(whoAddr);
                  end;
                OK_op:        { SGI sent an OK, just clear the reply pending bit for this SGI. }
                  begin
                    ClearReply(whoAddr);
                  end;
                SendTree_op:
                  ;
                otherwise
                  announce(StringOf('Got an invalid packet from SGI ', EthAddrToStr(whoAddr), ', opcode = ',
        ReadBuff[2] : 1, ', count = ', count : 1, ' . '));
              end;    { case }
          end;                { If got some ethernet reply }
      end;
    if SGIon then
      begin
        doit := (SGIreply = 0);
        if doit and doHardReply then
          doit := GotHardReply;
        if not doit then
          begin
            if (not here or (err = commandTimeout)) and (Ticks^ > NextTimeout) then
              begin
                if SGIreply = 0 then
                  AnnounceB('Hardsync timed out.');
                for i := 1 to NumOfSGI do
                  if BitTst(@SGIreply, i) then
                    AnnounceB(StringOf('SGI # ', i : 1, ' hasn''t responded in ', Timeout / 60 : 2 : 2, '
        seconds.'));
                ClearAllReplies;
                doit := true;
              end;
          end;
        if doit and (Ticks^ >= sendAfter) then
          begin
            BroadcastNew;                  { Then send a new change record. }
            NextTimeout := Ticks^ + Timeout;
          end;
```

```
    end;
  end;                     { CheckSGI }

  procedure EnDisItems;
   { Enable or Disable all the Isaac menu items depending on the state of SGIconnect. }
   var
     i, j: integer;
  begin
   for i := StartDy to EndDy do
     begin
       j := dyItemtoItem(IsaacMHndl, i);
       if SGIconnect then
         EnableItem(IsaacMHndl, j)
       else
         DisableItem(IsaacMHndl, j);
     end;
  end;

  procedure ConnectSGI;       { Open the ethertalk connections. }
   var
     i, err: integer;
     t, whoAddr, count: LongInt;
     here: Boolean;
  begin
   SGIconnect := false;

   EnDisItems;
   if writeBuffPtr = nil then
     begin
       Announce(StringOf('ConnectSGI: Can''t connect because writeBuffPtr is nil.'));
       exit(ConnectSGI);
     end;

   ClearAllReplies;
   err := InitEthernet;
   if err <> noErr then
     begin
       NumOfSGI := 0;
       Announce(StringOf('ConnectSGI: InitEthernet returned ', err : 1, '.'));
       exit(ConnectSGI);
     end;
   err := EtherOpen(UDPInfo);
   if err <> noErr then
     begin
       Announce(StringOf('EtherOpen returned error # ', err : 1));
       exit(ConnectSGI);
     end;

   WakeupSGIs;
   EnDisItems;

  end;
```

```
procedure unConnectSGI (quit: boolean);        { Unconnect to the SGI. }
  var
    i, err: integer;
begin
  if quit then
    for i := 1 to NumOfSGI do
      with SGI_Info[i] do
        if on then
          begin
            err := SendSimple(Quit_op, SGI_Info[i].addr);
          end;
  err := CloseEthernet(UDPInfo);
  SGIconnect := false;
  SGIon := false;
  doingAuto := false;
  i := DyItemtoItem(IsaacMHndl, ConnectDy);
  CheckItem(IsaacMHndl, i, SGIconnect);
  i := DyItemtoItem(IsaacMHndl, SendDy);
  CheckItem(IsaacMHndl, i, SGIon);
  i := DyItemtoItem(IsaacMHndl, AutoDy);
  CheckItem(IsaacMHndl, i, doingAuto);
  EnDisItems;
end;

function SendOccular (occ, sendpair: integer; sendDone: boolean): OSErr;
{ Send the given occular distance to the pair of sgi's with sendpair num. }
{ If sendDone is true then send the EyeDone_op to the SGI's. }
  var
    i, err: integer;
    SendCount: LongInt;
    occPacket: record
        head: PacketHeader;
        interOcc: integer;
      end;
begin
  if not SGIconnect then
    begin
      AnnounceB('The SGI''s aren''t hooked up.');
      SendOccular := notOpenErr;     { Return some kind of error. }
      exit(SendOccular);
    end;

  with occPacket do
    begin
      head.len := sizeof(occPacket);
      head.opcode := Eye_op;
      interOcc := occ;
    end;
  err := noErr;
  for i := 1 to NumOfSGI do
    with SGI_Info[i] do
      if on and (pair = sendpair) then
```

-000604

```
      begin
        if sendDone then
          begin
            err := SendSimple(EyeDone_op, addr);
          end
        else
          begin
{   occular := occ; }
            SendCount := occPacket.head.len;
            err := EtherWrite(UDPInfo, Ptr(@occPacket), SendCount, addr, false);
          end;
        if err <> noErr then
          begin
            Announce(StringOf('SendOccular: Send Ocular returned error # ', err : 1));
            leave;
          end;
        SetReply(i);
        if WaitForReply(SGI_Info[i].addr, 5 * 60) then
          ;
      end;    { For i, if sending to SGI number i. }
  SendOccular := err;
end;

  { Toggle the global SGIconnect and if it is true then connect up to the SGI's over ethertalk. }
procedure menuConnect (dyItem: integer);
  var
    i: integer;
begin
  if not SGIConnect then
    ConnectSGI
  else
    unConnectSGI(true);        { unconnect but don't tell the SGI's to quit. }
  i := DyItemtoItem(IsaacMHndl, ConnectDy);
  CheckItem(IsaacMHndl, i, SGIconnect);
end;

procedure menuViewNode (dyItem: integer);
  { Set the SGI view node to be the currently selected node. }
  var
    i, pairnum: integer;
    str: Str255;
begin
  if not SGIconnect then
    begin
      AnnounceB('The SGI''s aren''t hooked up.');
      exit(menuViewNode);
    end;

  pairnum := AskUserWhichSGI(true);  {sgi pair}
  if pairnum = -1 then
    exit(menuViewNode);

  if (mainTreePtr^.edPtr <> nil) then
```

```
    str := mainTreePtr^.edPtr^.name
  else
    str := '';
  for i := 1 to MaxSGIs do
    if (SGI_Info[i].on) and (SGI_Info[i].pair = pairnum) then
      SendViewPacket(i, SGI_Info[i].occular, 0, str);
  if not WaitForAllReplies then
    ;
end;

function AttribFrmUsr (var passedlongs: Long4; name: string): Boolean;
  { Set the isaac attributes in the 4 longs passed from a user dialog. }
  const
    styleMask = $F0000;
    toggleMask = $F0;          { for nvisbound, visbound, nvistree, nvisobj. }
    lowToggleBit = $10;
    wireOffset = 2;          { style value 2 maps to wire button 0. }

    handleAttribID = 2041;
    style1 = 6;
    style1wire = 7;
    style1smooth = 11;
    nvis1 = 12;
    visb1 = 15;
    vistree1 = 18;
    visobj1end = 23;

    style2 = 25;
    style2wire = 26;
    style2smooth = 30;
    nvis2 = 31;
    visb2 = 34;
    vistree2 = 37;
    visobj2end = 42;
  var
    attrDialog: dialogPtr;
    i, itemHit: integer;
    bitMask: longInt;
    longs: Long4;
    savePort: grafPtr;

  procedure SetBitBtns (bitMask, setnum, startItem: integer);
    var
      affectBit: Boolean;
      hit: integer;
  begin
    affectBit := BAND(longs[setnum], bitMask) <> 0;
    RadioOn(attrDialog, startItem, affectBit);
    if not affectBit then
      hit := 100
    else
      hit := ord(BAND(longs[setnum + 1], bitMask) <> 0);
    RadioRange(attrDialog, startItem + 1, 2, hit);
```

-000606

```
end;
procedure BitHit (startRange, idx, itemHit: integer);
 var
  i: integer;
  bitMask: LongInt;
begin
 i := itemHit - startRange;
 bitMask := BSL(lowToggleBit, (i div 3));
 case i mod 3 of
  0:
   begin
    longs[idx] := BXOR(longs[idx], bitMask);
    longs[idx + 1] := BAND(longs[idx + 1], BNOT(bitMask));
   end;
  1:
   begin
    longs[idx] := BOR(longs[idx], bitMask);
    longs[idx + 1] := BAND(longs[idx + 1], BNOT(bitMask));
   end;
  2:
   begin
    longs[idx] := BOR(longs[idx], bitMask);
    longs[idx + 1] := BOR(longs[idx + 1], bitMask);
   end;
 end;
 SetBitBtns(bitMask, idx, startRange + ((i div 3) * 3));
end;

procedure SetStyleBtns (startItem, setnum: integer);
 var
  affectStyle: Boolean;
  hit: integer;
begin
 affectStyle := BAND(longs[setnum], styleMask) <> 0;
 RadioOn(attrDialog, startItem, affectStyle);
 if not affectStyle then
  hit := 100
 else
  hit := BSR(BAND(longs[setnum + 1], styleMask), 16);
 RadioRange(attrDialog, startItem + 1, 5, hit - wireOffset);
end;

begin
 longs := passedLongs;
 for i := 0 to 3 do
  longs[i] := BAND(longs[i], styleMask + toggleMask);
 getPort(savePort);
 attrDialog := GetNewDialog(handleAttribID, nil, pointer(-1));
 PositionWindow(attrDialog, 50, 50);
 setPort(attrDialog);

 bitMask := lowToggleBit;
 for i := 0 to 3 do
```

-000607

```
    begin
      SetBitBtns(bitMask, 0, nvis1 + (i * 3));
      SetBitBtns(bitMask, 2, nvis2 + (i * 3));
      bitMask := BSL(bitMask, 1);
    end;

  SetStyleBtns(style1, 0);
  SetStyleBtns(style2, 2);

  showWindow(attrDialog);
  paramText(name, '', '', '');
  repeat
    modalDialog(nil, itemHit);
    case itemHit of
      nvis1..visobj1end:
        BitHit(nvis1, 0, itemHit);
      style1:
        begin
          if BAND(longs[0], styleMask) <> 0 then
            longs[0] := BAND(longs[0], BNOT(styleMask))
          else
            longs[0] := BOR(longs[0], styleMask);
          SetStyleBtns(style1, 0);
        end;
      style1wire..style1smooth:
        begin
          longs[0] := BOR(longs[0], styleMask);
          longs[1] := BAND(longs[1], BNOT(styleMask));
          longs[1] := BOR(longs[1], BSL((itemHit - style1wire + wireOffset), 16));
          SetStyleBtns(style1, 0);
        end;
      nvis2..visobj2end:
        BitHit(nvis2, 2, itemHit);
      style2:
        begin
          if BAND(longs[2], styleMask) <> 0 then
            longs[2] := BAND(longs[2], BNOT(styleMask))
          else
            longs[2] := BOR(longs[2], styleMask);
          SetStyleBtns(style2, 2);
        end;
      style2wire..style2smooth:
        begin
          longs[2] := BOR(longs[2], styleMask);
          longs[3] := BAND(longs[3], BNOT(styleMask));
          longs[3] := BOR(longs[3], BSL(itemHit - style2wire + wireOffset, 16));
          SetStyleBtns(style2, 2);
        end;

    end;
  until itemHit <= 2;
  if itemHit = 1 then
    begin
```

```
      passedLongs := longs;
      AttribFrmUsr := true;
    end
  else
    AttribFrmUsr := false;
  disposDialog(attrDialog);
  setPort(savePort);
  Announce(StringOf(Pointer(longs[0]), ' ', Pointer(longs[2])));
  Announce(StringOf(Pointer(longs[1]), ' ', Pointer(longs[3])));
end;

var
  atribStr1, atribStr2: Str255;

procedure old_menuAtribNode (dyItem: integer);
  { Set the SGI view node to be the currently selected node. }
  var
    atribPacket: record
        head: PacketHeader;
        nodenum: integer;
        clearAtrib: LongInt;
        setAtrib: longInt;
      end;
    i, err: integer;
    count: LongInt;
    str: string;
begin
  if (mainTreePtr^.edPtr = nil) then
    exit(old_menuAtribNode);
  if not SGIconnect then
    begin
      AnnounceB('The SGI''s aren''t hooked up.');
      exit(old_menuAtribNode);
    end;

  str := '<mode>, <nvis bnd, vis bnd, vis tree, vis obj>, 0 ';
  if not GetStrings(concat(str, chr(13), 'Clear bits?'), 'Set bits?', atribStr1, atribStr2) then
    exit(old_menuAtribNode);

  with atribPacket do
    begin
      head.len := sizeof(atribPacket);
      head.opcode := ChangeAttr_op;
      head.who := 0;
      nodenum := PtrtoL(mainTreePtr, mainTreePtr^.edPtr);
      clearAtrib := HextoNum(atribStr1);
      setAtrib := HextoNum(atribStr2);
      count := head.len;
    end;
  err := EtherWrite(UDPInfo, Ptr(@atribPacket), count, ALL_SGI, false);
  SetAllReplies;
end;
```

-000609

```
procedure menuAtribNode (dyItem: integer);
  { Set the SGI view node to be the currently selected node. }
  var
    atribPacket: record
        head: PacketHeader;
        nodenum: integer;
        clearAtrib: LongInt;
        setAtrib: longInt;
      end;
    i, err: integer;
    count: LongInt;
    str: string;
begin
  if (mainTreePtr^.edPtr = nil) then
    exit(menuAtribNode);
  if not SGIconnect then
    begin
      AnnounceB('The SGI''s aren''t hooked up.');
      exit(menuAtribNode);
    end;

  if optionisDown then
    begin
      old_menuAtribNode(0);
      exit(menuAtribNode);
    end;

  if not AttribFrmUsr(globAtrib, mainTreePtr^.edPtr^.name) then
    exit(menuAtribNode);

  with atribPacket do
    begin
      head.len := sizeof(atribPacket);
      head.opcode := ChangeAttr_op;
      head.who := 0;
      nodenum := PtrtoL(mainTreePtr, mainTreePtr^.edPtr);
      clearAtrib := globAtrib[0];
      setAtrib := globAtrib[1];
      count := head.len;
    end;
  err := EtherWrite(UDPInfo, Ptr(@atribPacket), count, ALL_SGI, false);
  SetAllReplies;
end;

procedure menuDefaultView (dyItem: integer);
  { Set the SGI view node to be the currently selected node. }
  var
    i: integer;
begin
  if not SGIconnect then
    begin
      AnnounceB('The SGI''s aren''t hooked up.');
      exit(menuDefaultView);
```

```
    end;

  for i := 1 to MaxSGIs do
    if SGI_Info[i].on then
      SendViewPacket(i, SGI_Info[i].occular, 0, SGI_Info[i].HeadName);
  if not WaitForAllReplies then
    ;
end;

procedure menuMouseOcc (dyItem: integer);
  { Drive the inter occular distances for two SGI's from the mouse position. }
  const
    MouseToOcc = 1.0;        { Mouse increment to change one unit of occular. }
  var
    i, err, occ, oldx, pairNum, which: integer;
    pt: Point;
    SendCount: LongInt;
    event: EventRecord;
    bool: boolean;
    TextDPtr: DialogPtr;
    occPacket: record
        head: PacketHeader;
        interOcc: integer;
      end;
begin
  if not SGIconnect then
    begin
      AnnounceB('The SGI''s aren''t hooked up.');
      exit(menuMouseOcc);
    end;

  pairNum := AskUserWhichSGI(true);   {pair of sgis}
  if pairNum < 1 then
    exit(menuMouseOcc);

  TextdPtr := GetNewDialog(justTextID, nil, pointer(-1));
  PositionWindow(TextdPtr, 50, 10);
  SetDlgText(TextdPtr, statText, 1, 'Setting Inter-ocular with the mouse, Hit a key to quit.');
  ShowWindow(TextdPtr);
  DrawDialog(TextdPtr);
  GetMouse(pt);
  oldx := pt.h;
  repeat
    GetMouse(pt);
    LocaltoGlobal(pt);
    if oldx <> pt.h then
      begin
        occ := round(pt.h * MouseToOcc);
        Announce(StringOf('Ocular = ', occ : 1, ', pair = ', pairNum : 1));
        err := SendOccular(occ, pairNum, false);
      end;
    oldx := pt.h;
  until KeyPress or (err <> noErr);
```

-000611

```
    bool := GetNextEvent(keyDownMask, Event);     { Eat the key that was pressed. }
    err := SendOccular(occ, pairNum, true);
    DisposDialog(TextdPtr);
  end;

    { If not connected then connect them.  Then set up to start sending records to the SGI. }
  procedure menuSGIon (dyItem: integer);
    var
      i: integer;
  begin
    if not SGIconnect then
      AnnounceB('You must connect first.')
    else
      begin
        SGIon := not SGIon;
        if SGIon then
          begin
            MakeRecordTree(false, false);     { Record the state of the BE tree. }
            ReconfigSGIs;          { And send a new tree to all the SGI's. }
          end;
        i := DyItemtoItem(IsaacMHndl, SendDy);
        CheckItem(IsaacMHndl, i, SGIon);
      end;
  end;

  function SGILoadFile (str: string): Boolean;
{ Try to get the SGI to load a file from it's disk. }
    var
      loadPacket: record
          head: PacketHeader;
          worldnum: integer;
          filename: string[40];
        end;
      count: longInt;
      i, err: integer;
      which, nodeNum: integer;
  begin
    if not SGIconnect then
      begin
        AnnounceB('The SGI''s aren''t hooked up.');
        exit(SGILoadFile);
      end;

    with loadPacket do
      begin
        head.len := sizeof(loadPacket);
        head.opcode := Load_op;
        head.who := 0;
        worldnum := -1;
        IsaacFName := str;
        filename := str;
        PtoCstr(filename);
        count := head.len;
```

```
    end;
   err := EtherWrite(UDPInfo, Ptr(@loadPacket), count, ALL_SGI, false);
   for i := 1 to NumOfSGI do          { pending for all the SGI's out there. }
    with SGI_Info[i] do
     if on then
      begin
       SetReply(i);
      end;
   if not WaitForAllReplies then
    begin
     AnnounceB('Try sending the file over to the SGI''s again.');
     SGILoadFile := false;
    end
   else
    SGILoadFile := true;
  end;

  procedure menuSGILoad (dyItem: integer);
{ Try to get the SGI to load a file from it's disk. }
   var
    loadPacket: record
        head: PacketHeader;
        worldnum: integer;
        filename: string[40];
      end;
    count: longInt;
    i, err: integer;
    which, nodeNum: integer;
    str: Str255;
  begin
   if not SGIconnect then
    begin
     AnnounceB('The SGI''s aren''t hooked up.');
     exit(menuSGILoad);
    end;

   str := IsaacFName;
   if GetStrings('File name on the SGI to load?', '', str, str) then
    begin
     if SGILoadFile(str) then
      ;
    end;
  end;

  procedure SGISend (prompt: string; doAuto: Boolean);
{ Send a file to the SGI. }
   const
    AnPackSize = 20;
   type
    SendHeader = record
        head: PacketHeader;
        isLastPacket: integer;
        filename: string[40];
```

-000613

```
    end;
  var
    SendPacket: record
        shead: SendHeader;
        bytes: packed array[0..MAX_PACKET] of byte;
      end;
    count: longInt;
    i, s, err, pk, vRef, RefNum, ByteSendSize: integer;
    nodeNum: integer;
    str: Str255;
    TList: SFTypeList;
    StartPtr: Ptr;
    b: Boolean;
begin
  if not SGIconnect then
    begin
      AnnounceB('The SGI''s aren''t hooked up.');
      exit(SGISend);
    end;

  OldFileIdent2(str, vRef, prompt, -1, TList);
  if str <> '' then
    begin
      if SGIOn then
        menuSGIon(0);
      err := FSOpen(str, vRef, refNum);
      if err = noErr then
        with SendPacket.shead do
          begin
            head.opcode := PutFile_op;
            head.who := 0;
            IsaacFName := str;
            filename := str;
            StartPtr := Ptr(ord4(@fileName) + length(filename) + 1);
            ByteSendSize := MAX_PACKET - (ord4(StartPtr) - ord4(@SendPacket));
            PtoCstr(filename);
            for s := 1 to NumOfSGI do
              if SGI_Info[s].on then
                begin
                  isLastPacket := 0;
                  err := SetFPos(refNum, fsFromStart, 0);
                  pk := 1;
                  repeat
                    count := ByteSendSize;
                    err := FSRead(refNum, count, StartPtr);
                    if (err = eofErr) then
                      begin
                        isLastPacket := -1;
                      end
                    else if err <> noErr then
                      begin
                        Announce(StringOf('Got error # ', err : 1, ' reading the file to send.'));
                        leave;
```

```
                end;
              if (pk mod AnPackSize) = 1 then
                Announce(StringOf('SGISend: File packet # ', pk : 1, ' to SGI # ', s : 1));
              head.len := (ord4(StartPtr) - ord4(@SendPacket)) + count;
              count := head.len;
              for i := 1 to 3 do
                begin { Try to send the ∂¤m∂et 3 times }
                  if i = 3 then
                    begin        { but on the last time say it's the last packet and exit. }
                      Announce('Three strikes and your out!');
                      isLastPacket := -1;
                    end;
                  err := EtherWrite(UDPInfo, Ptr(@SendPacket), count, SGI_Info[s].addr, false);
                  SetReply(s);
                  b := WaitForReply(SGI_Info[s].addr, 5 * 60);
                  if b then   { Got the reply so exit. }
                    Leave
                  else
                    Announce('SGISend: waitforReply failed, trying again...');
                end;
              pk := pk + 1;
            until isLastPacket <> 0;
          end; { for s if on }
        err := FSClose(refNum);
        if doingAuto and (str = IsaacFName) and doAuto then
          begin
                { If doing auto and the user is sending a new version of the isaac over }
                { Then reload a new version. }
            NeedNewIsaac;
          end;
      end;  { If file open worked }
    if not WaitForAllReplies then
      ;
  end;       { if the user picked a file }
end;

procedure menuSGISend (dyItem: integer);
begin
  SGISend('Choose the file you would like to send to all running Isaacs.', true);
end;

  { Toggle the SGI's monitor mode to RGB or NTSC. }
procedure menuTogMonitor (dyItem: integer);
  var
    i, err, op, sendpair: integer;
begin
  if not SGIconnect then
    AnnounceB('You must connect first.')
  else
    begin
      if NTSCmode then
        op := SetRGB_op
      else
```

-000615

```
        op := SetNTSC_op;
      NTSCmode := not NTSCmode;
      if optionIsDown then
        begin
          sendpair := AskUserWhichSGI(true);  {pair of sgis}
        end
      else
        sendpair := 1;
      { for now send to the first pair you find. }
      for i := 1 to NumOfSGI do
        with SGI_Info[i] do
          if on and (pair = sendpair) then
            begin
              err := SendSimple(op, SGI_Info[i].addr);
              SetReply(i);
            end;
      i := DyItemtoItem(IsaacMHndl, NTSCdy);
      CheckItem(IsaacMHndl, i, NTSCmode);
    end;
end;

procedure NeedNewIsaac;
  { Just got a message that a new file was loaded.  If connected try to update it on the SGI's. }
  var
    ok: Boolean;
    prompt: string;
begin
  if SGIConnect and doingAuto then
    begin
      prompt := StringOf('AutoIsaac: Telling the SGI''s to load "', IsaacFName, '".');
      Announce(prompt);
      ok := SGILoadFile(IsaacFName);
      if not ok then
        begin
          prompt := StringOf('At least one Isaac didn''t find the file "', IsaacFName, '".  Select it to send it
     over. ');
          SGISend(prompt, false);
          ok := SGILoadFile(IsaacFName);
        end;
      if not ok then
        exit(NeedNewIsaac);
      menuDefaultView(-1);
      Announce(StringOf('AutoIsaac: Sending new tree info.'));
      menuSGIon(0);
      if not SGIOn then
        menuSGIon(0);
    end;
end;

procedure menuAutoIsaac (dyItem: integer);
  var
    i: integer;
begin
```

```
  doingAuto := not doingAuto;
  i := DyItemtoItem(IsaacMHndl, AutoDy);
  CheckItem(IsaacMHndl, i, doingAuto);

  if doingAuto then
    begin
      if not SGIConnect then
        menuConnect(-1);
      if (IsaacFName <> '') then
        NeedNewIsaac;
      menuTogMonitor(-1);          { flip the NTSC state to make sure the mac and SGI's are synced. }
      if not NTSCmode then        { If state is now wrong, then flip back. }
        menuTogMonitor(-1);
    end;
end;

procedure InitSGI;          { Called at the beginning of the program. }
  var
    i: integer;
    SLOT_OFFSET: LongInt;
begin
  globAtrib[0] := 0;
  globAtrib[1] := 0;
  writeBuffPtr := IntArPtr(NewPtr(WRITE_SIZE));
  if writeBuffPtr = nil then
    Announce(StringOf('InitSGI: NewPtr of writeBuffPtr failed.'));
  SGIconnect := false;
  SGIon := false;
  NTSCmode := false;
  IsaacFName := '';
  syncOnChange := true;
  NoSyncMin := 2;
  doingAuto := false;
  if not (ADIOSbit in DAconfig.bits) then          { If macAdios isn't connected then }
    doHardReply := false                          {  make sure doHardReply is false. }
  else
    doHardReply := true;

  i := dyNewItem(IsaacMHndl, 'Configure', @UserConfigSGI, false);
  AutoDy := dyNewItem(IsaacMHndl, 'AutoIsaac', @menuAutoIsaac, false);
  ConnectDy := dyNewItem(IsaacMHndl, 'Connect', @menuConnect, false);
  SendDy := dyNewItem(IsaacMHndl, 'Sending...', @menuSGIon, false);
  StartDy := SendDy;
  i := dyNewItem(IsaacMHndl, 'Transfer file', @menuSGISend, false);
  i := dyNewItem(IsaacMHndl, 'Load Isaac file', @menuSGILoad, false);
  i := dyNewItem(IsaacMHndl, 'Set Attributes', @menuAtribNode, false);
  i := dyNewItem(IsaacMHndl, 'View Edit Node', @menuViewNode, false);
  i := dyNewItem(IsaacMHndl, 'Set default Views', @menuDefaultView, false);
  i := dyNewItem(IsaacMHndl, 'Set Ocular with mouse', @menuMouseOcc, false);
  NTSCdy := dyNewItem(IsaacMHndl, 'NTSC mode', @menuTogMonitor, false);
  EndDy := NTSCdy;
  SetSGIConfig;     { Get the default SGI addresses and other configuration info. }
  EnDisItems;
```

```
 end;

 procedure CloseSGI;    { Called when the program ends. }
 begin
   if SGIconnect then
     begin
       if NTSCmode then          { If in NTSC mode then try to go back to RGB. }
         menuTogMonitor(-1);
       unConnectSGI(true);
     end;
 end;

{---------------------------------------------------------------------------}
 type

   OcctInfo = record
       pairNum: integer;
       isSending, oldSGIon: Boolean;
     end;
   OcctInfoPtr = ^OcctInfo;

{ 2 Inputs, 1 output. }
{ The second input is a boolean control input.  If it is false (zero) do nothing. }
{ If it is true then send the value of the first input as the inter-occular distance }
{ for the pair of SGI's given in the DM's calibration.  When the control goes from }
{ true to false then send the done command. }


  procedure doOccDM; { (var dm: DMRec) }
    var
      optr: OcctInfoPtr;
      err: integer;
  begin
    optr := OcctInfoPtr(@dm.privateWords);

    if SGIconnect then
      with dm do
        if (SlotsIn[1].ptrfrm^.i <> 0) then
          begin
            if not optr^.isSending then
              begin
                optr^.oldSGIon := SGIon;
                SGIon := false;
                optr^.isSending := true;
              end;
            err := SendOccular(SlotsIn[0].ptrfrm^.i, optr^.pairNum, false);
            with PointsOut[0] do
              begin
                LastValue.i := SlotsIn[0].ptrfrm^.i;
                SetSixth(ptrto, ord(SixAxis), LastValue.i);
              end;
          end
        else if optr^.isSending then
```

-000618

```
        begin
          err := SendOccular(0, optr^.pairNum, true);
          optr^.isSending := false;
          SGIon := optr^.oldSGIon;
          Announce(StringOf('doOcDM: Set Ocular on pair # ', optr^.pairNum : 1, ' to ', SlotsIn[0].ptrfrm^.i
        : 1));
        end;
  end;

{ HandleOccDM does the setup for the Occular DM.  get the pairNum from the user, etc. }
  procedure HandleOccDM; { (v: DMVerb; var dm: DMRec) }
    var
      optr: OcctInfoPtr;
      i: integer;
    procedure Calibrate;
      var
        optr: OcctInfoPtr;
        str: Str255;
        l: longInt;
    begin
      optr := OcctInfoPtr(@dm.privateWords);
      NumtoString(optr^.pairNum, str);
      If GetStrings('Send inter-ocular to which pair?', '', str, str) then
        begin
          StringtoNum(str, l);
          optr^.pairNum := l;
        end;
    end;

  begin
    case v of
      initDM:              { Called once the first time this DM is started. }
        begin
          if dm.private <> nil then
            doClose(dm);
          optr := OcctInfoPtr(@dm.privateWords);
          optr^.pairNum := 0;
          optr^.isSending := false;
          Calibrate;
        end;
      massageDM:           { Called once through the main loop.  do a massage }
        begin
          doOccDM(dm);       { This shouldn't actually be called, doPass is called directly. }
        end;
      closeDM:
        doClose(dm);              { Called at the end of the program run.  Do whatever... }
      reHookedDM:
        ;
      fopenDM:             { This DM has just been read from a file.  If it's state is }
                           { on it was hooked up properly.  private points to the }
        begin              { private memory it had when saved. }
        end;
      fsaveDM:             { This DM is about to be saved to a file.  Do any changes }
```

```
      begin          { nessessary to private memory so it can be restored later. }
        optr := OcctInfoPtr(@dm.privateWords);
        optr^.isSending := false;
      end;
    calibDM:
      Calibrate;                    { Calibrate the DM module. }
    describeDM:
      DescribeStr := StringOf('When input #2 is true, send input #1 to the SGI pair.');
    writeCodeDM:
      ;
    otherwise         { Should be no other. }
      sysbeep(3);
  end;        { case }
end;          { HandleOccDM }

{-----------------------------------------------------------------------------}
{ 2-6 Inputs. }
{ An IssacAttrib DM allows you to turn Issac attributes on and off for nodes or lists of nodes. }
{ Input #1 is a boolean.  If true turn the specified attributes on, else turn them off. }
{ Input #2-6 are either points or pointLists.  Do this to all the specified points. }


procedure AddThis (p: PRecPtr; var wptr: ptrsType; var Flags: Long2);
    { Add this point to the list of points that are going to be changed. }
  var
    cp: chgAttribPtr;
begin
  cp := chgAttribPtr(wptr.lp);
  wptr.l := wptr.l + sizeof(chgAttribRec);
  cp^.nodeNum := PtrtoL(mainTreePtr, p);
  cp^.onoff := Flags;
{* Announce(StringOf('AddThis: ', cp^.nodeNum : 1, '  ', Pointer(Flags[0]), ' ', Pointer(Flags[1])));*}
end;


procedure doIAttribDM (var dm: DMRec);
  var
    l4: Long4Ptr;
    Flags: Long2;
    i, err: integer;
    p: PRecPtr;
    cp: chgAttribPtr;
    wptr: ptrsType;

begin
  with dm do
    begin
      if ((SlotsIn[0].ptrfrm^.i <> 0) <> (PointsOut[0].LastValue.i <> 0)) then
        begin  { Leading edge true }
          l4 := Long4Ptr(dm.Private);
          if SlotsIn[0].ptrfrm^.i <> 0 then
            begin
              Flags[0] := l4^[0];
```

```
          Flags[1] := l4^[1];
        end
      else
        begin
          Flags[0] := l4^[2];
          Flags[1] := l4^[3];
        end;
      WriteBuffPtr^[PAC_LEN] := 0;
      WriteBuffPtr^[PAC_OP] := ChangeAttr_op;
      WriteBuffPtr^[PAC_WHO] := ALL_SGI;
      wptr.l := ord4(WriteBuffPtr) + PAC_HEADSIZE;
      for i := 1 to 5 do
        with SlotsIn[i] do
          if ptrfrm <> nil then
            begin
              if inType = pointListD then
                begin
                  p := PRecPtr(ptrfrm^.l);
                  while p <> nil do
                    begin
                      AddThis(p, wptr, flags);
                      p := PRecPtr(ord4(p) + 4);
                    end;
                end
              else if inType = pointD then
                AddThis(PRecPtr(ptrfrm), wptr, flags)
            end;
      WriteCount := wptr.l - ord4(WriteBuffPtr);
      WriteBuffPtr^[PAC_LEN] := WriteCount;
      if SGIconnect then
        begin
          SetAllReplies;
          err := EtherWrite(UDPInfo, Ptr(WriteBuffPtr), WriteCount, ALL_SGI, false);
        end;
    end;
    PointsOut[0].LastValue.i := SlotsIn[0].ptrfrm^.i;
  end;
end;

procedure doAtribIndexDM (var dm: DMRec);
  { Input #1 is an index, input #2 is a point. Turn the i'th point from start^.down on }
  { by sending the on attributes and turn the last on point off by sending the off attributes. }
  var
    l4: Long4Ptr;
    onFlags, offFlags: Long2;
    i, err, newidx, oldidx: integer;
    p: PRecPtr;
    cp: chgAttribPtr;
    wptr: ptrsType;

begin
  with dm do
    begin
```

```
      newidx := SlotsIn[0].ptrfrm^.i;
      oldidx := PointsOut[0].LastValue.i;
      if newidx <> oldidx then
        begin
          l4 := Long4Ptr(dm.Private);
          onFlags[0] := l4^[0];
          onFlags[1] := l4^[1];
          offFlags[0] := l4^[2];
          offFlags[1] := l4^[3];
          WriteBuffPtr^[PAC_LEN] := 0;
          WriteBuffPtr^[PAC_OP] := ChangeAttr_op;
          WriteBuffPtr^[PAC_WHO] := ALL_SGI;
          wptr.l := ord4(WriteBuffPtr) + PAC_HEADSIZE;
          p := PRecPtr(SlotsIn[1].ptrfrm);
          i := 0;
          while p <> nil do
            begin
              if i = newidx then
                AddThis(p, wptr, onFlags)
              else if i = oldidx then
                AddThis(p, wptr, offFlags);
              i := i + 1;
              p := p^.down;
            end;
          WriteCount := wptr.l - ord4(WriteBuffPtr);
          WriteBuffPtr^[PAC_LEN] := WriteCount;
          if SGIconnect then
            begin
              SetAllReplies;
              err := EtherWrite(UDPInfo, Ptr(WriteBuffPtr), WriteCount, ALL_SGI, false);
            end;
        end;
      PointsOut[0].LastValue.i := newidx;
    end;
  end;

{ HandleIAttribDM does the setup for the Isaac Atribute DM. }
  procedure HandleIAttribDM (v: DMVerb; var dm: DMRec);
    var
      i: integer;
      l4: Long4Ptr;
      b: Boolean;

  begin
    case v of
      initDM:            { Called once the first time this DM is started. }
        begin
          if dm.private <> nil then
            doClose(dm);
          dm.private := NewPvt(sizeof(Long4));
          if dm.private <> nil then
            begin
              dm.PointsOut[0].LastValue.i := 1;
```

```
        l4 := Long4Ptr(dm.Private);
        for i := 0 to 3 do
          l4^[i] := 0;
        b := AttribFrmUsr(l4^, dm.name);
      end
    else
      begin
        Announce('Not enough memory to open this Isaac Attributes DM');
        dm.state := usrOff;
      end;
  end;
closeDM:
  doClose(dm);
massageDM:      { Called once through the main loop.  do a massage }
  begin
    doIAttribDM(dm);      { This shouldn't actually be called, doPass is called directly. }
  end;
fopenDM:                  { Because some of these didn't have private storage. }
  if dm.private = nil then
    HandleIAttribDM(initDM, dm);
calibDM:
  b := AttribFrmUsr(Long4Ptr(dm.Private)^, dm.name);   { Calibrate the DM module. }
otherwise
  GenericHandle(v, dm);
end;      { case }
end;      { HandleIAttribDM }

{$endc }

end.
```

-000623

```
{   SGImisc.pas - Miscelaneous routines for SGICom.pas. }
{   © VPL Research, Inc.  Chuck Blanchard 5/12/89 }


unit SGImisc;
interface


  uses
    CompileTime, AutoLib, ChuckStuff, FastStuff, Globals, Tree3DGlob, MacADIOSutils, macADIOSDAcq,
       EtherGlue;

{$ifc for_SGIs  }

  const
    MaxSGIs = 4;                { Maximum number of SGI's allowed. }
    SGIconfigRes = 'SGIc';
    Global_Info_ResID = 2000;

  type

    { SGI_Info_Type describes the running configuration for each SGI that is hooked up. }
    SGI_Info_Type = record
        addr: longInt;           { Set by user, Ethernet address for this SGI. }
        HeadName: NameStr;       { Set by user, Head to track for this SGI. }
        occular: integer;        { Set by user, Default inter-Occular distance to use. }
        on,                          { True if addr <> 0 and Wakup found someone at the address. }
        RightEye: Boolean;           { Set by user, specifies whether this is a right or left eye. }
        whoBit: integer;         { not used anymore. }
        pair: integer;           { Set by user, specifies which pair of glasses this SGI is an eye for. }
        comment: string;             { Set by user, not used by the code.  anything the use wants, prob SGI
         name. }
      end;
    SGI_Info_Ptr = ^SGI_Info_Type;

    Global_SGI_Info = record
        doHardReply: boolean;
        NoSyncMin: integer;
      end;
    Global_SGI_Info_Ptr = ^Global_SGI_Info;

  var
    NumOfSGI: integer;           { Number of SGI's the mac is talking to. }
    SGI_Info: array[1..MaxSGIs] of SGI_Info_Type;
    syncOnChange: boolean;       { True if you wait for a sync packet on sending change packets }
    NoSyncMin: integer;          { if nosync, min number of Jiffies to wait before sending another packet.
        }
    doHardReply: Boolean;        { True if expecting hardware reply for send on MacAdios card. }

  procedure SetSGIConfig;
```

```
        NumOfSGI := sginum;
        p := pointer(h^);
        SGI_Info[sginum] := p^;
        on := false;
        whoBit := BitShift(1, sginum - 1);
        ReleaseResource(Handle(h));
      end;
  end;
end;

procedure SaveSGIConfig;
 { Save the current SGI config state to the application resource fork. }
 var
  i: integer;
  h: Handle;
  gi: Global_SGI_Info;

begin
 UseResFile(ApplRes);
 gi.doHardReply := doHardReply;
 gi.NoSyncMin := NoSyncMin;
 if syncOnChange then
  gi.NoSyncMin := -1;

 AddPtrResource(@gi, sizeof(Global_SGI_Info), SGIconfigRes, Global_Info_ResID, 'Global SGI config');

 NumOfSGI := 0;
 for i := 1 to MaxSGIs do
  if SGI_Info[i].addr = 0 then
   begin
     { Didn't specify an address, just delete this resource. }
    h := GetResource(SGIconfigRes, i);
    if h <> nil then
     RmveResource(h);
   end
  else
   begin
    NumOfSGI := i;
    AddPtrResource(@SGI_Info[i], sizeof(SGI_Info_Type), SGIconfigRes, i, 'SGI config');
   end
end;

procedure UserConfigSGI;
 { Let the user set the SGI configuration. }
 const
  SGIconfigID = 2102;
  MaxBits = 15;

   { The EdItem's count just Edit fields in the dialog. The four addresses are the first 4 edit }
   { items in the list althogh they are actually items 3-6. }
  addrEdItem = 1;          { n'th edit number of the first address item. }
  viewEdItem = 5;          { n'th edit number of the first view node item. }
  ocEdItem = 9;            { n'th edit number of the first occular distance item. }
```

```
  pairEdItem = 13;            { n'th edit number of the first pair item. }
  nameEdItem = 17;            { n'th edit number of the first name item. }
  syncjiffEdItem = 21;        { n'th edit number of the no sync jiffy count item. }

  eyeItem = 12;
  hardSyncItem = 36;

var
  dlogPtr: DialogPtr;
  i, itemHit, kind: Integer;
  r: Rect;
  h: Handle;
  text: Str255;

procedure SetEditFields (dlogPtr: DialogPtr);
  var
    sginum: integer;
begin
  SetEdText(dlogPtr, syncjiffEdItem, StringOf(NoSyncMin : 1));

  if not (ADIOSbit in DAconfig.bits) then
    begin        { If macAdios isn't connected then disable }
      GetDItem(dlogPtr, hardSyncItem, kind, h, r);       { the hardSync check item. }
      HiliteControl(ControlHandle(h), 255);
      doHardReply := false;                              { and make sure doHardReply is false. }
    end
  else
    RadioOn(dlogPtr, hardSyncItem, doHardReply);

  for sginum := 1 to MaxSGIs do
    with SGI_Info[sginum] do
      if addr = 0 then
        begin
          text := '';
          SetEdText(dlogPtr, addrEdItem + sginum - 1, text);
          SetEdText(dlogPtr, viewEdItem + sginum - 1, text);
          SetEdText(dlogPtr, ocEdItem + sginum - 1, text);
          SetEdText(dlogPtr, pairEdItem + sginum - 1, text);
          SetEdText(dlogPtr, nameEdItem + sginum - 1, text);
          RightEye := false;
          RadioOn(dlogPtr, eyeItem + sginum - 1, false);
        end
      else
        begin
          text := StringOf(Pointer(addr));
          text := EthAddrtoStr(addr);
          SetEdText(dlogPtr, addrEdItem + sginum - 1, text);
          SetEdText(dlogPtr, viewEdItem + sginum - 1, HeadName);
          SetEdText(dlogPtr, ocEdItem + sginum - 1, StringOf(occular : 1));
          SetEdText(dlogPtr, pairEdItem + sginum - 1, StringOf(pair : 1));
          SetEdText(dlogPtr, nameEdItem + sginum - 1, comment);
          RadioOn(dlogPtr, eyeItem + sginum - 1, RightEye);
        end;
```

```
end;

procedure GetStateFromEdits (dlogPtr: DialogPtr);
  var
    sginum: integer;
    text:  Str255;

  function StrtoNum (str: string): integer;
    var
      l: LongInt;
  begin
    if str = '' then
      StrtoNum := 0
    else
      begin
        StringToNum(str, l);
        StrtoNum := l;
      end;
  end;

begin
  GetEdText(dlogPtr, syncjiffEdItem, text);
  NoSyncMin := StrtoNum(text);
  syncOnChange := (NoSyncMin < 0);

  for sginum := 1 to MaxSGIs do
    with SGI_Info[sginum] do
      begin
        GetEdText(dlogPtr, addrEdItem + sginum - 1, text);
        if text = '' then
          begin
              { Didn't specify an address, just make addr = 0. }
            addr := 0;
          end
        else
          begin
            addr := StrtoEthAddr(text);
            GetEdText(dlogPtr, viewEdItem + sginum - 1, text);
            HeadName := text;
            GetEdText(dlogPtr, ocEdItem + sginum - 1, text);
            occular := StrtoNum(text);
            GetEdText(dlogPtr, nameEdItem + sginum - 1, text);
            comment := text;
            GetEdText(dlogPtr, pairEdItem + sginum - 1, text);
            pair := StrtoNum(text);
          end;
      end;
end;

begin
  InitCursor;
  dlogPtr := GetNewDialog(SGIconfigID, nil, Pointer(-1));
  PositionWindow(dlogPtr, 50, 50);
```

-000627

```
    SetEditFields(dlogPtr);
    ShowWindow(dlogPtr);
    repeat
      ModalDialog(nil, itemHit);
      if itemHit = hardSyncItem then
        begin
          doHardReply := not doHardReply;
          RadioOn(dlogPtr, hardSyncItem, doHardReply);
        end
      else if (itemHit >= eyeItem) and (itemHit < eyeItem + MaxSGIs) then
        with SGI_Info[itemHit - eyeItem + 1] do
          begin
            RightEye := not RightEye;
            RadioOn(dlogPtr, itemHit, RightEye);
          end;
    until itemHit <= 2;  { Until OK or Cancel is clicked. }
    if itemHit = 1 then
      begin { OK clicked. }
        GetStateFromEdits(dlogPtr);
        SaveSGIConfig;
      end;
    DisposDialog(dlogPtr);
  end;

{$endc }

end.
```

```
end;

procedure CalcSinCos (p: PRecPtr);
  type
    axis = (ayaw, apitch, aroll);
  var
    a: axis;
    testVector: array[axis] of Point3D;
begin
  testVector[ayaw].x := VecSize;
  testVector[ayaw].y := 0;
  testVector[ayaw].z := 0;
  testVector[apitch].x := 0;
  testVector[apitch].y := VecSize;
  testVector[apitch].z := 0;
  testVector[aroll].x := VecSize;
  testVector[aroll].y := 0;
  testVector[aroll].z := 0;
  for a := ayaw to aroll do
    with testVector[a] do
      begin
        if p^.up <> nil then
          with p^.up^ do
            begin
              RotwithSine(x, z, sines.yaw, cosines.yaw);
              RotwithSine(z, y, sines.pitch, cosines.pitch);
              RotwithSine(x, y, sines.roll, cosines.roll);
            end;
{ !!! angles coming out are negated and roll isn't right }
        if p^.ISix.tt.yaw <> 0 then
          Rot(x, z, degrange(-p^.ISix.tt.yaw));
        if p^.ISix.tt.pitch <> 0 then
          Rot(z, y, degrange(-p^.ISix.tt.pitch));
        if p^.ISix.tt.roll <> 0 then
          Rot(x, y, degrange(-p^.ISix.tt.roll));
      end;
  p^.sines.yaw := testVector[ayaw].z;
  p^.cosines.yaw := testVector[ayaw].x;
  p^.sines.pitch := testVector[apitch].z;
  p^.cosines.pitch := testVector[apitch].y;
  p^.sines.roll := testVector[aroll].y;
  p^.cosines.roll := testVector[aroll].x;
end; { CalcSinCos }

procedure CalcSinCosUp (p: PRecPtr);
begin
  if p^.up <> nil then
    CalcSinCosUp(p^.up);
  CalcSinCos(p);
  ShowSinCos(p);
end;

procedure BangShowVec (p: PRecPtr);
```

```
  var
    sp: PRecPtr;
 begin
  sp := fFindTreeName(mainTreePtr, 'ShowVec');
  if sp <> nil then
    begin
      sp^.lSix.tt.yaw := SinCostoAngle(p^.sines.yaw, p^.cosines.yaw);
      sp^.lSix.tt.pitch := SinCostoAngle(p^.sines.pitch, p^.cosines.pitch);
      sp^.lSix.tt.roll := SinCostoAngle(p^.sines.roll, p^.cosines.roll);
      sp^.dirty := true;
      with sp^.lSix.tt do
        Announce(StringOf('Global: yaw= ', yaw / 10 : 3 : 1, ', pitch= ', pitch / 10 : 3 : 1, ', roll = ', roll
      / 10 : 3 : 1));
    end;
 end;

 procedure CalcSinCosPath (p: PRecPtr);
 begin
  CalcSinCosUp(p);
  BangShowVec(p);
 end;

 const
  TestBias = 1024;

 procedure LoctoGlobRot (p: PRecPtr);
  { Convert the local rotation lSix.RotTrip to global rotation cosines. }
 begin
  DirtyConvert(p);
  testVecYaw.lSix.pt.x := TestBias;
  testVecPitch.lSix.pt.z := TestBias;
  testVecRoll.lSix.pt.y := TestBias;
  testVec.up := p;
  dirtyTreeWalk(@testVec, true);
  p^.cosines.yaw := testVecYaw.gPt.y - p^.gPt.y;
  p^.cosines.pitch := testVecPitch.gPt.y - p^.gPt.y;
  p^.cosines.roll := testVecRoll.gPt.y - p^.gPt.y;
 end;

 procedure SinCosConvert (p: PRecPtr);
 begin
 end;

 procedure GlobtoLocRot (p: PRecPtr);
  { Convert the global rotation cosines to local rotation in lSix.RotTrip. }
 begin
  DirtyConvert(p);
  testVecYaw.gPt.x := p^.gPt.x + TestBias;
  testVecPitch.gPt.z := p^.gPt.z + TestBias;
  testVecRoll.gPt.y := p^.gPt.z + TestBias;
  testVec.up := p;

 end;
```

-000630

```
procedure InitTestVec;
  { Initialize the test vector that is used to convert local to global rotations. }
  const
    Bias = 3600;
  var
    p: PRecPtr;
  procedure InitPt (var pr: PointRec; str: string);
    var
      i: integer;
  begin
    with pr do
      begin
        name := str;
        for i := 0 to 5 do
          lSix.s[i] := 0;
        up := nil;
        down := nil;
        right := nil;
        SetDefaultMinMax(@pr);
      end;
  end;
 begin
  InitPt(testVec, 'testVec');
  InitPt(testVecYaw, 'testVecYaw');
  InitPt(testVecPitch, 'testVecPitch');
  InitPt(testVecRoll, 'testVecRoll');
  with testVecYaw do
    begin
      up := @testVec;
      right := @testVecPitch;
      lSix.pt.x := Bias;
    end;
  with testVecPitch do
    begin
      up := @testVec;
      right := @testVecRoll;
      lSix.pt.z := Bias;
    end;
  with testVecRoll do
    begin
      up := @testVec;
      lSix.pt.y := Bias;
    end;
 end;


end.
```

```
{ RawHandle has been changed to SlotHandle which handles allocation of slots for }
{ any SlotDesc.  It also handles the window for the SlotDesc.  Currently there }
{are two SlotDesc's one for the Raw Window and one for the DM's window. }

{ RawHandle handles allocation of the slots for raw data.  DataA's request a number }
{ of slots and DataM's find out where the raw data they need is. }

unit RawUnit;

interface
  uses
    ChuckStuff, FastStuff, Globals;

  const
    RawWindID = 130;
    DMWindID = 131;

  var
    RawDesc: SlotDesc;

  function AllocateSlots (var Slot: SlotDesc; name: nameStr; size: integer): integer;
{ Allocate this number of raw slots. }
  function AllocateRaw (name: nameStr; size: integer): integer;

{ Find the index into the rawData for the given name.  return -1 if not found. }
  function FindRaw (name: nameStr; crntPtr: intPtr): integer;

  procedure ResizeSlotW (var Slot: SlotDesc); { Called if a Slot window is resized. }
  procedure InitSlot (var Slot: SlotDesc;         { Initialize Slot/Window. }
              name: string; on: boolean;   { Name for this window if WindID not used. }
              id: integer;                 { id number for the WIND resource to use. }
              mProc: ProcPtr);             { Procedure that Handles mousedowns. }
  procedure CloseSlot (slot: SlotDesc; id: integer);    { Close the slot window and save window state. }
  procedure InitRaw;
  procedure ChangeSlotWind (var Slot: SlotDesc; on: boolean);
  procedure RawWindow (on: boolean);       { Turn the raw window on/off }
  procedure SlotText (var Slot: SlotDesc); { Update text for this slot. }
  procedure RawText;                       { Update the text in the raw window. }
  procedure SlotMouse (var Slot: SlotDesc;    { MouseDown in the Slot window. }
              ev: EventRecord);
  procedure SlotUpdate (var Slot: SlotDesc);  { Respond to an update event. }
  procedure SlotActivate (var Slot: SlotDesc; { Respond to an activate event. }
              on: boolean);
  function RawPtName (pt: Point): NameStr;

implementation

  var
    { These are for the displaying the raw values. }
    RawVSep,                     { Vertical separation between lines }
    RawVStart: integer;          { Vertical pixel for first line }
    SlottoScroll: SlotDescPtr;   { Ptr to slot to scroll for the proc ScrollAction. }
```

```
  SlotOffset: integer;          { Ammount to offset the next Slot Window. }

procedure CallMA (var Slot: SlotDesc; ev: EventRecord; idx: Integer; MouseProc: ProcPtr);
inline
  $205F,   { move.l  (a7)+,a0 }
  $4E90;   { jsr     (a0)     }

procedure ResizeSlotW; {  (var Slot : SlotDesc) }
{ This routine is called if the Raw window is resized or some more raw storage }
{ is allocated.  In either case the scroll bar has to be recalculated. }
begin
  with Slot do
    begin
      with wp^.portRect do
        DispLines := minOf(numUsed, ((bottom - top) div RawVSep) - 1);
      SlotStart := minOf(SlotStart, numUsed - DispLines);
      if (SlotStart = 0) and (DispLines >= numUsed) then
        begin      { all the data is displayed.  don't show scrollbar. }
          HideControl(VScrollH);
        end
      else
        begin
          HideControl(VScrollH);
          with wp^.portRect do
            begin
              MoveControl(VScrollH, right - 15, top - 1);
              SizeControl(VScrollH, 16, bottom - top - 13);
            end;
          SetCtlMax(VScrollH, numUsed - DispLines);
          SetCtlValue(VScrollH, SlotStart);
          ShowControl(VScrollH);
        end;
    end;     { with Slot }
end;         { ResizeSlotW }

{ Find the index into the SlotDesc for the given name.  return -1 if not found. }
{ if crntPtr isn't nil and it is a valid ptr into the rawarray, then first check to }
{ see if the slot it points to has the given name.  If it does, return that. }
function FindSlot (Slot: SlotDesc; name: nameStr; crntPtr: intPtr): integer;
  var
    i: integer;
    found: boolean;
begin
  found := false;
  with Slot do
    begin
      if crntPtr <> nil then   { does the current pointer point to the right place? }
        if (ord4(crntPtr) >= ord4(dataPtr)) then
          if (ord4(crntPtr) <= ord4(@dataPtr^[numUsed])) then
            begin
              i := (ord4(crntPtr) - ord4(@dataPtr)) div 2;
              if EqualString(Slot.dataDefPtr^[i].name, name, false, false) then
                found := true
```

-C00633

```
        end;
      if not found then
        begin
          i := 0;
          repeat
            if EqualString(Slot.dataDefPtr^[i].name, name, false, false) then
              found := true
            else
              i := i + 1;
          until found or (i > numUsed);
        end;
    end;
  if found then
    FindSlot := i
  else
    FindSlot := -1;
end;   { FindSlot }

{ Find the index into the rawData for the given name.  return -1 if not found. }
{ if crntPtr isn't nil and it is a valid ptr into the rawarray, then first check to }
{ see if the slot it points to has the given name.  If it does, return that. }
  function FindRaw; { (name : nameStr; crntPtr : intPtr) :  integer }
  begin
    FindRaw := FindSlot(RawDesc, name, crntPtr);
  end;

{ Allocate this number of slots from the SlotDesc Slot. }
  function AllocateSlots; { (var Slot : SlotDesc; name : nameStr; size : integer) : integer }
    var
      i, j: integer;
      found: boolean;
  begin
    i := 0;
    j := 0;
    found := false;
    with Slot do
      begin
        repeat   { Find a range of empty slots that is >= Size }
          if dataDefPtr^[i + j].name = '' then
            j := j + 1
          else
            begin
              i := i + 1;
              j := 0;
            end;
        until (j >= size) or (i + j > maxSlot);
        if (i + size - 1 <= maxSlot) then  { If this fits into the maxSlot bounds }
          begin
            if i + Size - 1 > numUsed then      { If Adding to number of slots used. }
              numUsed := i + Size - 1;
            AllocateSlots := i;                 { Return first slot index }
            dataDefPtr^[i].name := name;        { FirstSlot gets name }
            dataPtr^[i] := 0;
```

```
        for j := 1 to size - 1 do          { The rest of the slots get }
          begin                            { named Name<Num> }
            dataDefPtr^[i + j].name := StringOf(name, j + 1 : 1);
            dataDefPtr^[i + j].flags := 0;
            dataPtr^[i + j] := 0;
          end;
        ResizeSlotW(Slot);
      end
    else
      AllocateSlots := -1;
  end;
end;    { AllocateSlots }

{ Allocate this number of raw slots. }
function AllocateRaw; { (name : nameStr; size : integer) : integer}
begin
  AllocateRaw := AllocateSlots(RawDesc, name, size);
end;
{----------------------------------------------------------------}
{ Stuff to handle the Raw window. }

procedure InitScrollBar (var Slot: SlotDesc);
  var
    r: Rect;
begin
  with Slot do
    begin
      r := wp^.portRect;
      with wp^.portRect do
        SetRect(r, right - 15, top - 1, right + 1, bottom - 14);
      vScrollH := NewControl(wp, r, 'V', false, SlotStart, 0, maxSlot, scrollBarProc, 0);
      ResizeSlotW(Slot);
    end;
end;

procedure InitSlot; { (var Slot : SlotDesc; name: string; on: boolean; id: integer; mProc: ProcPtr) }
{ Initialize the window for this slot description.  The name and data pointers and }
{ maxSlot are already set up. }
  var
    i, j: integer;
    WRect: Rect;
    WType: integer;
    fi: FontInfo;
begin
  with Slot do
    begin
      SetRect(WRect, 12, 60, 130, 320);
      OffsetRect(WRect, SlotOffset, SlotOffset);
      SlotOffset := SlotOffset + 5;
      WType := documentProc;
      if (id = 0) then
        wp := nil
      else
```

```
        wp := GetNewWindow(id, nil, Pointer(-1));
      if wp <> nil then
        begin
          if CheckOnScreen(wp) then
            ;
        end
      else
        wp := NewWindow(nil, WRect, name, on, WType, Pointer(-1), true, 0);
      SetPort(wp);
      TextSize(9);
      TextFont(monaco);
      TextMode(srcCopy);
      GetFontInfo(fi);
      RawVStart := fi.ascent + 2;
      RawVSep := fi.ascent + fi.descent;
      SlotStart := 0;
      DispLines := 30;
      numUsed := -1;
      dispHex := false;
      MouseProc := StripAddress(mProc);
      for i := 0 to maxSlot do
        begin
          dataPtr^[i] := 0;
          dataDefPtr^[i].name := '';
          dataDefPtr^[i].flags := 0;
        end;
      InitScrollBar(Slot);
    end;
  end;

  procedure CloseSlot;{ (slot: SlotDesc; id: integer) }
  begin
    if slot.wp <> nil then
      SaveWindState(slot.wp, id);
    CloseWindow(slot.wp);
  end;

  procedure RawMouse;
  external;

{ Initialize the data structures and window for the Raw Slot/Window. }
  procedure InitRaw;
  begin
    SlotOffset := 0;
    with RawDesc do
      begin
        dataPtr := @RawData;
        dataDefPtr := @RawDataDef;
        maxSlot := maxRawData;
        InitSlot(RawDesc, 'Raw', true, RawWindID, @RawMouse);
        CheckItem(DAMHndl, TogDecItem, not dispHex);
        CheckItem(WindMHndl, RawWItem, WindowOn(RawDesc.wp));
      end;
```

-000636

```
  end;

  procedure ChangeSlotWind; { (var Slot : SlotDesc; on : boolean) }
  begin
    with Slot do
      begin
        if WindowOn(wp) <> on then
          begin
            if on then
              begin
                ShowWindow(wp);
                SelectWindow(wp);
                SetPort(wp);
              end
            else
              HideWindow(wp);
          end;
      end;
  end; { SlotWindow }
{ Show or hide the window for the raw Data. }
  procedure RawWindow; {• on : boolean);•}
  begin
    ChangeSlotWind(RawDesc, on);
    CheckItem(WindMHndl, RawWItem, on);
  end;

  procedure DrawText (var Slot: SlotDesc);
    { Draw the text for the given Slot window. }
    var
      i, j, vs: integer;
      nstr: string;
  begin
    with Slot do
      begin
        vs := RawVStart;
        for i := 0 to DispLines do
          begin
            j := SlotStart + i;
            moveto(1, vs);
            if j <= maxSlot then
              begin
                if dispHex then
                  nstr := concat('$', AHexWord(dataPtr^[j]), ' ')
                else
                  nstr := StringOf(dataPtr^[j] : 6);
                DrawString(StringOf(nstr, ' ', dataDefPtr^[j].name))
              end;
            vs := vs + RawVSep;
          end;
      end;     { with Slot }
  end;         { DrawText }

{ Draw the text in the Raw window. }
```

```
procedure SlotText; { (var Slot : SlotDesc) }
  var
    oldClip: RgnHandle;
    r: Rect;
begin
  with Slot do
    if WindowOn(wp) then
      begin
        SetPort(wp);
        oldClip := newRgn;
        GetClip(oldClip);
        r := wp^.portRect;
        r.right := r.right - 16;
        ClipRect(r);
        DrawText(Slot);
        SetClip(oldClip);
        DisposeRgn(oldClip);
      end;
end;
procedure RawText;
begin
  SlotText(RawDesc);
end;

{ Respond to an Update event for the Slot window. }
 procedure SlotUpdate; { (var Slot: SlotDesc) }
  var
    r: Rect;
 begin
  with Slot do
    begin
      SetPort(wp);
      eraseRect(wp^.portRect);
      DrawGrowIcon(wp);
      with wp^.portRect do
        SetRect(r, left, bottom - 16, right - 15, bottom);
      eraseRect(r);
      if FrontWindow = wp then
        DrawControls(wp);
      SlotText(Slot);
    end;
 end;

 procedure SlotActivate; { (var Slot: SlotDesc; on : boolean) }
{ An activate event has occured to turn this window on or off. }
  var
    oldClip: RgnHandle;
    r: Rect;
 begin
  with Slot do
    if WindowOn(wp) then
      begin
        SetPort(wp);
```

```
        oldClip := newRgn;
        GetClip(oldClip);
        r := wp^.portRect;
        r.left := r.right - 15;
        ClipRect(r);
        if on then
          DrawControls(wp)
        else
          eraseRect(r);
        DrawGrowIcon(wp);
        SetClip(oldClip);
        DisposeRgn(oldClip);
      end;
  end;

  procedure SlotScroll (var Slot: SlotDesc; change: integer);
{ Scroll the text by change lines. }
    var
      i: integer;
      rgn, oldClip: RgnHandle;
      r: Rect;
  begin
    if change <> 0 then
      with Slot do
        begin
          i := change * RawVSep;
          SlotStart := SlotStart - change;
          rgn := NewRgn;
          r := wp^.portrect;
          r.right := r.right - 16;
          ScrollRect(r, 0, i, rgn);
          oldClip := newRgn;
          GetClip(oldClip);
          SetClip(rgn);
          SlotText(Slot);
          DisposeRgn(rgn);
          SetClip(oldClip);
          DisposeRgn(oldClip);
        end;
  end;

  procedure ScrollAction (cH: ControlHandle; partCode: integer);
    var
      newStart: integer;
  begin
    with SlottoScroll^ do
      begin
        case partCode of
          inUpButton:
            newStart := maxOf(SlotStart - 1, 0);
          inDownButton:
            newStart := minOf(SlotStart + 1, numUsed - 1);
          inPageUp:
```

```
        newStart := maxOf(SlotStart - (DispLines), 0);
      inPageDown:
        newStart := minOf(SlotStart + (DispLines), numUsed - 1);
      otherwise
        newStart := SlotStart;
    end;
    newStart := minOf(newStart, numUsed - DispLines);
    SetCtlValue(cH, newStart);
    SlotScroll(SlottoScroll^, SlotStart - newStart);
  end;
end;

procedure SlotMouse; { (var Slot : SlotDesc; ev : EventRecord) }
  { MouseDown in the raw window. }
  var
    i, newStart, idx: integer;
    ctl: ControlHandle;
begin
  with Slot do
    begin
      SetPort(wp);
      GlobaltoLocal(ev.where);
      i := FindControl(ev.where, wp, ctl);
      if ctl = VScrollH then
        begin  { mouse down in scroll bar. }
          if i = inThumb then
            begin
              i := TrackControl(VScrollH, ev.where, nil);
              if i = inThumb then
                begin
                  newStart := GetCtlValue(VScrollH);
                  newStart := minOf(newStart, numUsed - DispLines);
                  SlotScroll(Slot, SlotStart - newStart);
                end;
            end
          else
            begin
              SlottoScroll := @Slot;
              i := TrackControl(VScrollH, ev.where, @ScrollAction);
            end;
        end     { if FindControl in VScrollH }
      else
        begin { Mouse down in the contents of the slot window. }
          idx := ev.where.v div RawVSep + SlotStart;
          if MouseProc <> nil then
            CallMA(Slot, ev, idx, MouseProc);
        end;
    end;        { with Slot }
  end;          { SlotMouse }

  function SlotPtName (pt: Point; slot: SlotDesc): NameStr;
    { Return the slot name that's under the given point. }
    var
```

-000639

```
    i: integer;
    ctl: ControlHandle;
    oldPort: GrafPtr;
  begin
    GetPort(oldPort);
    with slot do
      begin
        SetPort(wp);
        GlobaltoLocal(pt);
        if pt.h >= VScrollH^^.contrlRect.left then { mouse down in scroll bar. }
          SlotPtName := ''
        else
          begin
            i := pt.v div RawVSep + SlotStart;
            SlotPtName := dataDefPtr^[i].name;
          end;
      end;
    SetPort(oldPort);
  end;

  function RawPtName (pt: Point): NameStr;
    { Return the slot name that's under the given point in the raw window. }
  begin
    RawPtName := SlotPtName(pt, RawDesc);
  end;
end.
```

```
{ AutoLib, smAutoLib. © 1989 VPL Research Inc. }
{ CLB 7/1/89 }

{ AutoLib is a collection of routines to improve the ease of programming the Mac toolbox. }
{ It includes a collection of random routines collectively called ChuckStuff, DynamicMenus, }
{ AutoWindows and the automatic Announce window. smAutoLib is everything except ChuckStuff. }

{ DynamicMenus allow you to add/subtract menu items without having to worry about actual }
{ item numbers. You refer to items by a unique dyItem returned to you when the item is added. }
{ Also when an item is added the address of the procedure to execute when the menu is hit. }

{ AutoWindows are windows that handle open/close/grow/move/update etc in an automatic way. }
{ When an autowindow is initialized you can specify what routines should execute when something }
{ happens to the window. }
{ Announce is an autowindow that you can announce strings to. It buffers the strings and handles }
{ updating, scrolling etc on the window. }

unit AutoLib;

interface

  var
    AnnounceWPtr: WindowPtr;

{ from DynamicMenu.pas }
  procedure InitDynamicMenu;

    { mh is the menu handle to install the menu item in. str is the name for the }
    { new item. proc is a pointer to the code to execute. Return a unique identifier. }
  function dyNewItem (mh: MenuHandle; str: str255; proc: Ptr; DashFirst: boolean): integer;

    { Delete the given menu and dynamic Item. Return true if successful }
  function dyDelItem (mh: MenuHandle; dyItem: integer): boolean;

    { Given a menu handle and a unique identifier, return the mac menu item if found. }
  function dyItemtoItem (var mh: MenuHandle; dyItem: Integer): integer;

    { Given a menu handle and an item number. If the item is a dynamic item then }
    { execute it and return true, else return false. }
  function dyMenu (mh: MenuHandle; Item_No: integer): boolean;
    { Given a menu ID and an item number. If the item is a dynamic item then }
    { execute it and return true, else return false. }
  function dyMenuID (menuID, Item_No: integer): boolean;

    { Set the given dynamic menu item to have the given text. do a delete/insert }
    { so meta-chars are reconized. }
  procedure dySetItem (dyItem: integer; str: str255);

{ from AutoWindow.pas }
{ Definition of an AutoType structure. AddAutoWind() returns a handle }
{ to the calling procedure so you need this header to customize an }
{ autowindow. }
```

```
type
  AutoPtr = ^AutoType;
  AutoHandle = ^AutoPtr;
  AutoType = record
      wp: WindowPtr;
      next: AutoHandle;
      contProc: ProcPtr;
      keyProc: ProcPtr;
      updateProc: ProcPtr;
      activeProc: ProcPtr;
      growProc: ProcPtr;
      dragProc: ProcPtr;
      closeProc: ProcPtr;
      openProc: ProcPtr;
      growRect, dragRect: Rect;
      dyItem: integer;
    end;

 procedure InitAutoWind (MenuID: integer);
 function AddAutoWind (wp: WindowPtr): AutoHandle;
 function DelAutoWind (wp: WindowPtr): Boolean;
 function isAutoWind (evt: EventRecord): boolean;

 procedure Announce (str: Str255);
 procedure AnnounceB (str: Str255);
 procedure InitAnnounce;
 procedure CloseAnnounce;
 procedure ChangeAnnounce (on: Boolean);

implementation
 procedure InitDynamicMenu;
 External;
 function dyNewItem;
 External;
 function dyDelItem;
 External;
 function dyItemtoItem;
 External;
 function dyMenu;
 External;
 function dyMenuID;
 External;
 procedure dySetItem;
 External;
{ from AutoWindow.pas }
 procedure InitAutoWind;
 External;
 function AddAutoWind;
 External;
 function DelAutoWind;
 External;
 function isAutoWind;
 External;
```

```
procedure Announce;
External;
procedure AnnounceB;
External;
procedure InitAnnounce;
External;
procedure CloseAnnounce;
External;
procedure ChangeAnnounce;
External;
end.
```

```
          LastValue.i := dm.SlotsIn[0].ptrfrm^.i;
          for i := 1 to dm.Inputs - 1 do
            LastValue.i := (LastValue.i - dm.SlotsIn[i].ptrfrm^.i);
        end;
      longD:
        begin
          LastValue.l := dm.SlotsIn[0].ptrfrm^.l;
          for i := 1 to dm.Inputs - 1 do
            LastValue.l := (LastValue.l - dm.SlotsIn[i].ptrfrm^.l);
        end;
      fixedD:
        begin
          LastValue.f := dm.SlotsIn[0].ptrfrm^.f;
          for i := 1 to dm.Inputs - 1 do
            LastValue.f := (LastValue.f - dm.SlotsIn[i].ptrfrm^.f);
        end;
      realD:
        begin
          LastValue.r := dm.SlotsIn[0].ptrfrm^.r;
          for i := 1 to dm.Inputs - 1 do
            LastValue.r := (LastValue.r - dm.SlotsIn[i].ptrfrm^.r);
        end;
      otherwise
        ;
    end;
    if ptrto <> nil then
      SetSixthType(ptrto, ord(SixAxis), LastValue, outType);
  end;
end;

procedure doTimes;
  var
    i: integer;
begin
  with dm.PointsOut[0] do
    begin
      case outType of
        intD:
          begin
            LastValue.i := dm.SlotsIn[0].ptrfrm^.i;
            for i := 1 to dm.Inputs - 1 do
              LastValue.i := (LastValue.i * dm.SlotsIn[i].ptrfrm^.i);
          end;
        longD:
          begin
            LastValue.l := dm.SlotsIn[0].ptrfrm^.l;
            for i := 1 to dm.Inputs - 1 do
              LastValue.l := (LastValue.l * dm.SlotsIn[i].ptrfrm^.l);
          end;
        fixedD:
          begin
            LastValue.f := dm.SlotsIn[0].ptrfrm^.f;
            for i := 1 to dm.Inputs - 1 do
```

-000644

```
          LastValue.f := (LastValue.f * dm.SlotsIn[i].ptrfrm^.f);
        end;
      realD:
        begin
          LastValue.r := dm.SlotsIn[0].ptrfrm^.r;
          for i := 1 to dm.Inputs - 1 do
            LastValue.r := (LastValue.r * dm.SlotsIn[i].ptrfrm^.r);
        end;
      otherwise
        ;
    end;
    if ptrto <> nil then
      SetSixthType(ptrto, ord(SixAxis), LastValue, outType);
  end;
end;

procedure doBitAnd;
  var
    i: integer;
begin
  with dm.PointsOut[0] do
    begin
      LastValue.i := dm.SlotsIn[0].ptrfrm^.i;
      for i := 1 to dm.Inputs - 1 do
        LastValue.i := BAND(LastValue.i, dm.SlotsIn[i].ptrfrm^.i);
      if ptrto <> nil then
        SetSixth(ptrto, ord(SixAxis), LastValue.i);
    end;
end;

procedure doBitOr;
  var
    i: integer;
begin
  with dm.PointsOut[0] do
    begin
      LastValue.i := dm.SlotsIn[0].ptrfrm^.i;
      for i := 1 to dm.Inputs - 1 do
        LastValue.i := BOR(LastValue.i, dm.SlotsIn[i].ptrfrm^.i);
      if ptrto <> nil then
        SetSixth(ptrto, ord(SixAxis), LastValue.i);
    end;
end;

procedure doBitXor;
  var
    i: integer;
begin
  with dm.PointsOut[0] do
    begin
      LastValue.i := dm.SlotsIn[0].ptrfrm^.i;
      for i := 1 to dm.Inputs - 1 do
        LastValue.i := BXOR(LastValue.i, dm.SlotsIn[i].ptrfrm^.i);
```

```
      if ptrto <> nil then
        SetSixth(ptrto, ord(SixAxis), LastValue.i);
    end;
  end;

{-----------------------------------------------------}
{      Division is just 2 inputs, 1 output            }
{-----------------------------------------------------}

  procedure doDiv;
    { out1 := in1 / in2 / in3 etc except that for now the dm is restricted to 2 inputs. }
    var
      l: longInt;
      i: integer;
  begin
    with dm.PointsOut[0] do
      begin
        LastValue := dm.SlotsIn[0].ptrfrm^;          { Get the divisor. }

        for i := 1 to dm.Inputs - 1 do
          if dm.SlotsIn[i].ptrfrm^.l = 0 then        { If long is zero then so is fixed and real. }
            LastValue.l := 0
          else
            case outType of
              intD:
                if dm.SlotsIn[i].ptrfrm^.i = 0 then{ Since int is 2 bytes not 4 it must be tested individually. }
                  LastValue.i := 0
                else
                  LastValue.i := (LastValue.i div dm.SlotsIn[i].ptrfrm^.i);
              longD:
                LastValue.l := (LastValue.l div dm.SlotsIn[i].ptrfrm^.l);
              fixedD:
                LastValue.f := FixDiv(LastValue.f, dm.SlotsIn[i].ptrfrm^.f);
              realD:
                LastValue.r := (LastValue.r / dm.SlotsIn[i].ptrfrm^.r);
              otherwise
                ;
            end;
        if ptrto <> nil then
          SetSixthType(ptrto, ord(SixAxis), LastValue, outType);
      end;
  end;

{-----------------------------------------------------}
{      1-6 inputs, 1-3 outputs math dms.  }
{-----------------------------------------------------}
  procedure doPluses;
    var
      i, j: integer;
  begin
    i := 0;
    j := 0;
    with dm do
```

```
    while i < Inputs do
      begin
        with PointsOut[j] do
          begin
            if i + 1 = Inputs then
              LastValue.i := SlotsIn[i].ptrfrm^.i
            else
              LastValue.i := SlotsIn[i].ptrfrm^.i + SlotsIn[i + 1].ptrfrm^.i;
            if ptrto <> nil then
              SetSixth(ptrto, ord(SixAxis), LastValue.i);
          end;
        i := i + 2;
        j := j + 1;
      end;
end;

procedure doTimeses;
  var
    i, j: integer;
begin
  i := 0;
  j := 0;
  with dm do
    while i < Inputs do
      begin
        with PointsOut[j] do
          begin
            if i + 1 = Inputs then
              LastValue.i := SlotsIn[i].ptrfrm^.i
            else
              LastValue.i := SlotsIn[i].ptrfrm^.i * SlotsIn[i + 1].ptrfrm^.i;
            if ptrto <> nil then
              SetSixth(ptrto, ord(SixAxis), LastValue.i);
          end;
        i := i + 2;
        j := j + 1;
      end;
end;

procedure doMinuses;
  var
    i, j: integer;
begin
  i := 0;
  j := 0;
  with dm do
    while i < Inputs do
      begin
        with PointsOut[j] do
          begin
            if i + 1 = Inputs then
              LastValue.i := SlotsIn[i].ptrfrm^.i
            else
```

```
          LastValue.i := SlotsIn[i].ptrfrm^.i - SlotsIn[i + 1].ptrfrm^.i;
         if ptrto <> nil then
          SetSixth(ptrto, ord(SixAxis), LastValue.i);
        end;
       i := i + 2;
       j := j + 1;
      end;
  end;

{-----------------------------------------------------}
{      Boolean DM's }
{-----------------------------------------------------}
  procedure doNot;
  begin
    with dm.PointsOut[0] do
      begin
        if dm.SlotsIn[0].ptrfrm^.i = 0 then
          LastValue.i := 1
        else
          LastValue.i := 0;
        if ptrto <> nil then
          SetSixth(ptrto, ord(SixAxis), LastValue.i);
      end;
  end;
  procedure doBoolean;
    var
      b: Boolean;
  begin
    b := (dm.SlotsIn[0].ptrfrm^.i <> 0);
    with dm.PointsOut[0] do
      begin
        LastValue.i := ord(b);
        if ptrto <> nil then
          SetSixth(ptrto, ord(SixAxis), LastValue.i);
      end;
    with dm.PointsOut[1] do
      begin
        LastValue.i := ord(not b);
        if ptrto <> nil then
          SetSixth(ptrto, ord(SixAxis), LastValue.i);
      end;
  end;

  procedure doEqual;
  begin
    with dm.PointsOut[0] do
      begin
        if dm.SlotsIn[0].ptrfrm^.i = dm.SlotsIn[1].ptrfrm^.i then
          LastValue.i := 1
        else
          LastValue.i := 0;
        if ptrto <> nil then
          SetSixth(ptrto, ord(SixAxis), LastValue.i);
```

```
    end;
  end;
  procedure doNotEq;
  begin
    with dm.PointsOut[0] do
      begin
        if dm.SlotsIn[0].ptrfrm^.i <> dm.SlotsIn[1].ptrfrm^.i then
          LastValue.i := 1
        else
          LastValue.i := 0;
        if ptrto <> nil then
          SetSixth(ptrto, ord(SixAxis), LastValue.i);
      end;
  end;
  procedure doGreaterThan;
  begin
    with dm.PointsOut[0] do
      begin
        LastValue.i := ord(dm.SlotsIn[0].ptrfrm^.i > dm.SlotsIn[1].ptrfrm^.i);
        if ptrto <> nil then
          SetSixth(ptrto, ord(SixAxis), LastValue.i);
      end;
    with dm.PointsOut[1] do
      begin
        LastValue.i := ord(dm.SlotsIn[0].ptrfrm^.i <= dm.SlotsIn[1].ptrfrm^.i);
        if ptrto <> nil then
          SetSixth(ptrto, ord(SixAxis), LastValue.i);
      end;
  end;
  procedure doLessThan;
  begin
    with dm.PointsOut[0] do
      begin
        if dm.SlotsIn[0].ptrfrm^.i < dm.SlotsIn[1].ptrfrm^.i then
          LastValue.i := 1
        else
          LastValue.i := 0;
        if ptrto <> nil then
          SetSixth(ptrto, ord(SixAxis), LastValue.i);
      end;
  end;
  procedure doGreaterEq;
  begin
    with dm.PointsOut[0] do
      begin
        if dm.SlotsIn[0].ptrfrm^.i >= dm.SlotsIn[1].ptrfrm^.i then
          LastValue.i := 1
        else
          LastValue.i := 0;
        if ptrto <> nil then
          SetSixth(ptrto, ord(SixAxis), LastValue.i);
      end;
  end;
```

```
procedure doLessEq;
begin
  with dm.PointsOut[0] do
    begin
      if dm.SlotsIn[0].ptrfrm^.i <= dm.SlotsIn[1].ptrfrm^.i then
        LastValue.i := 1
      else
        LastValue.i := 0;
      if ptrto <> nil then
        SetSixth(ptrto, ord(SixAxis), LastValue.i);
    end;
end;

{ HandleCompares handles comparison routines that have two inputs and one output. It is only}
{ special in that the WriteCodeDM message looks up and tries to write the correct }
{ code for this DM. }
procedure HandleCompares; { (v : DMVerb; var dm : DMRec) }
  var
    i, opcode: integer;
begin
  case v of
    massageDM:        { Called once through the main loop. do a massage }
      begin
        sysbeep(1);
      end;
    writeCodeDM:
      begin
        with dm do
          if massageProc = @doEqual then
            opcode := $6702 {beq *+4}
          else if massageProc = @doNotEq then
            opcode := $6602 {bne *+4}
          else if massageProc = @doGreaterThan then
            opcode := $6E02 {bgt *+4}
          else if massageProc = @doLessThan then
            opcode := $6D02 {blt *+4}
          else if massageProc = @doGreaterEq then
            opcode := $6C02 {bge *+4}
          else if massageProc = @doLessEq then
            opcode := $6F02 {ble *+4}
          else
            opcode := 0;
        if opcode <> 0 then
          begin
            Add_MovetoDn(Pointer(dm.SlotsIn[0].ptrfrm), 2);    { d2 = input #0 }
            Add_MovetoDn(Pointer(dm.SlotsIn[1].ptrfrm), 1);    { d1 = input #1 }
            Add_Word($7001);                                  {moveq #1,d0}
            Add_Word($B441);                                  {cmp.w d1,d2}
            Add_Word(opcode);                                   { bne *+4  or variation therof }
            Add_Word($7000);                                  {moveq #0,d0}
            Add_D0toLastValue(dm.PointsOut[0]);               { save result }
          end;
      end;
```

```
    otherwise
      GenericHandle(v, dm);
  end;      { case }
end;        { HandleCompares }

procedure doBitNot;
begin
  with dm.PointsOut[0] do
    begin
      LastValue.i := BNOT(dm.SlotsIn[0].ptrfrm^.i);
      if ptrto <> nil then
        SetSixth(ptrto, ord(SixAxis), LastValue.i);
    end;
end;

procedure doByteSwap;
{ Swap the high and low bytes of the given inputs }
  var
    i: integer;
    l1, l2: longint;
begin
  for i := 0 to dm.inputs - 1 do
    with dm.PointsOut[i] do
      begin
        l1 := dm.SlotsIn[i].ptrfrm^.i;
        l2 := BitShift(l1, 8);
        LastValue.i := integer(l2 + BitShift(l1, -8));
        if ptrto <> nil then
          SetSixth(ptrto, ord(SixAxis), LastValue.i);
      end;
end;


procedure doNegDegree;
{ Put a 0-359 degree value into the range -179 to 180 }
{ Swap the high and low bytes of the given inputs }
  var
    i: integer;
    l1, l2: longint;
begin
  for i := 0 to dm.inputs - 1 do
    with dm.PointsOut[i] do
      begin
        l1 := dm.SlotsIn[i].ptrfrm^.i;
        l2 := BitShift(l1, 8);
        LastValue.i := DegRange(dm.SlotsIn[i].ptrfrm^.i);
        if LastValue.i > 1800 then
          LastValue.i := LastValue.i - 3600;
        if ptrto <> nil then
          SetSixth(ptrto, ord(SixAxis), LastValue.i);
      end;
end;
```

```
{-----------------------------------------------------}
{ Averaging DM's }
{-----------------------------------------------------}

 procedure doAveTwo; { (var dm : DMRec) }
{ Output = input1 * input2 / 2 }
  var
   i: integer;
 begin
  with dm.PointsOut[0] do
   begin
    LastValue.i := (dm.SlotsIn[0].ptrfrm^.i + dm.SlotsIn[1].ptrfrm^.i) div 2;
    if ptrto <> nil then
     SetSixth(ptrto, ord(SixAxis), LastValue.i);
   end;
 end;

{-----------------------------------------------------}
 procedure doAveby; { (var dm : DMRec) }
{ Average by the value in privateWords[0]. }
  var
   i, ave: integer;
 begin
  ave := dm.privateWords[0];
  for i := 0 to dm.inputs - 1 do
   with dm.PointsOut[i] do
    begin
     LastValue.i := (LastValue.i * (ave - 1) + dm.SlotsIn[i].ptrfrm^.i) div ave;
     if ptrto <> nil then
      SetSixth(ptrto, ord(SixAxis), LastValue.i);
    end;
 end;
{ Aveby has its own handle routine so that the user can set the average on calibrate. }
 procedure HandleAveby; { (v : DMVerb; var dm : DMRec) }
  var
   i: integer;
  procedure resetLast;
   var
    i: integer;
  begin
   for i := 0 to dm.outputs - 1 do
    dm.PointsOut[i].LastValue.i := 0;
  end;
  procedure Calibrate;
   var
    str1, str2: Str255;
  begin
   str1 := StringOf(dm.privateWords[0] : 1);
   if GetStrings('Average By', '', str1, str2) then
    dm.privateWords[0] := StringtoInt(str1);
  end;
  procedure WriteCode;
```

```
  const
    MUL_D2D0 = $c1c2;              { muls     d2,d0 }
    DIVS_D1D0 = $81c1;                 { divs     d1,d0 }
    EXTL_D0 = $48c0;                   { ext.l    d0     }
    ADDW_AddrtoD0 = $D079;         { add.w    <addr>,d0 }
  var
    i: integer;
begin
  Add_MoveImDn(dm.privateWords[0], 1);          { put average by into D1 }
  Add_MoveImDn(dm.privateWords[0] - 1, 2);      { put average by -1 into D2 }
  for i := 0 to dm.inputs - 1 do
    begin
      Add_MovetoD0(@dm.PointsOut[i].LastValue.i);      { Get last value }
      Add_Word(MUL_D2D0);                              { Times (average by -1) }
      Add_Word(ADDW_AddrtoD0);                     { plus new value }
      Add_Addr(Pointer(dm.SlotsIn[i].ptrfrm));
      Add_Word(EXTL_D0);                               { extend to long result }
      Add_Word(DIVS_D1D0);                             { Divided by average by. }
      Add_D0toLastValue(dm.PointsOut[i]);
    end;
end;

begin
  case v of
    initDM:            { Called once the first time this DM is started. }
      begin
        dm.private := nil;
        dm.privateWords[0] := 4;
        Calibrate;
      end;
    massageDM:         { Called once through the main loop.  do a massage }
      begin
        doAveby(dm);       { This shouldn't actually be called, doAveby is called directly. }
      end;
    closeDM:
      doClose(dm);               { Called at the end of the program run.  Do whatever... }
    reHookedDM:
      ;
    fopenDM:           { This DM has just been read from a file.  If it's state is }
                       { on it was hooked up properly.  private points to the }
      begin            { private memory it had when saved. }
        resetLast;
      end;
    fsaveDM:           { This DM is about to be saved to a file.  Do any changes }
      begin            { nessessary to private memory so it can be restored later. }
      end;
    calibDM:
      Calibrate;                 { Calibrate the DM module. }
    describeDM:
      describeStr := StringOf('Average by ', dm.privateWords[0] : 1);
    writeCodeDM:
      WriteCode;
    otherwise          { Should be no other. }
```

-000653

```
      sysbeep(3);
   end;        { case }
 end;          { HandleAveby }

{-----------------------------------------------------}
 procedure doLimit; { (var dm : DMRec) }
{ Limit the output to be between privateWords[0] and privateWords[1]. }
   var
     i, ave: integer;
 begin
   ave := dm.privateWords[0];
   for i := 0 to dm.inputs - 1 do
     with dm, dm.PointsOut[i] do
       begin
         LastValue.i := MinMaxOf(privateWords[0], dm.SlotsIn[i].ptrfrm^.i, privateWords[1]);
         If ptrto <> nil then
           SetSixth(ptrto, ord(SixAxis), LastValue.i);
       end;
 end;
{ Limit has its own handle routine so that the user can set the min and max on calibrate. }
 procedure HandleLimit; { (v : DMVerb; var dm : DMRec) }
   var
     i: integer;
   procedure resetLast;
     var
       i: integer;
   begin
     for i := 0 to dm.outputs - 1 do
       dm.PointsOut[i].LastValue.i := 0;
   end;
   procedure Calibrate;
     var
       str1, str2: Str255;
   begin
     str1 := StringOf(dm.privateWords[0] : 1);
     str2 := StringOf(dm.privateWords[1] : 1);
     if GetStrings('Minimum Limit?', 'Maximum Limit?', str1, str2) then
       begin
         dm.privateWords[0] := StringtoInt(str1);
         dm.privateWords[1] := StringtoInt(str2);
       end;
   end;
   procedure WriteCode;
   { Write the code to limit the output between two ranges. }
     var
       i: integer;
   begin
     for i := 0 to dm.inputs - 1 do
       begin
         Add_Word(SUBQ_2_SP);
         Add_Word(PUSH_IMW_Op);            { move.w     #min, -(sp) }
         Add_Word(dm.privateWords[0]);
         Add_Word(PUSHW_MEM);             { move.w     inputAddr,-(sp) }
```

```
      Add_Addr(Ptr(dm.SlotsIn[i].ptrfrm));
      Add_Word(PUSH_IMW_Op);          { move.w     #max, -(sp) }
      Add_Word(dm.privateWords[1]);
      Add_Word(JSR_ABS_Op);          { jsr MinMaxOf }
      Add_Addr(@MinMaxOf);
      Add_Word(PULLW_D0);
      Add_D0toLastValue(dm.PointsOut[i]);
    end;
  end;


begin
  case v of
    initDM:           { Called once the first time this DM is started. }
      begin
        dm.private := nil;
        dm.privateWords[0] := 0;
        dm.privateWords[1] := 10000;
        Calibrate;
      end;
    massageDM:        { Called once through the main loop. do a massage }
      begin
        doLimit(dm);      { This shouldn't actually be called, doLimit is called directly. }
      end;
    closeDM:
      doClose(dm);              { Called at the end of the program run. Do whatever... }
    reHookedDM:
      ;
    fopenDM:          { This DM has just been read from a file. If it's state is }
                      { on it was hooked up properly. private points to the }
      begin           { private memory it had when saved. }
        resetLast;
      end;
    fsaveDM:          { This DM is about to be saved to a file. Do any changes }
      begin           { nessessary to private memory so it can be restored later. }
      end;
    calibDM:
      Calibrate;                { Calibrate the DM module. }
    CalibPartDM:
      begin
      end;
    describeDM:
      describeStr := StringOf('Limit between ', dm.privateWords[0] : 1, ' and ', dm.privateWords[1] : 1);
    writeCodeDM:
      ;
    otherwise         { Should be no other. }
      sysbeep(3);
  end;      { case }
end;        { HandleAveby }


{-----------------------------------------------------}
procedure doStep; { (var dm : DMRec) }
```

```
{ Constrain the output to only change by steps greater than the calibrated value. }
   var
     i, step, newValue: integer;
  begin
    step := dm.privateWords[0];
    for i := 0 to dm.inputs - 1 do
      with dm.PointsOut[i] do
        begin
          newValue := dm.SlotsIn[i].ptrfrm^.i;
          if abs(newValue - LastValue.i) >= step then
            LastValue.i := newValue;
          if ptrto <> nil then
            SetSixth(ptrto, ord(SixAxis), LastValue.i);
        end;
  end;
{ Step has its own handle routine so that the user can set the average on calibrate. }
  procedure HandleStep; { (v : DMVerb; var dm : DMRec) }
   var
     i: integer;
   procedure resetLast;
     var
       i: integer;
   begin
     for i := 0 to dm.outputs - 1 do
       dm.PointsOut[i].LastValue.i := 0;
   end;
   procedure Calibrate;
     var
       str1, str2: Str255;
   begin
     str1 := StringOf(dm.privateWords[0] : 1);
     if GetStrings('Step By', '', str1, str2) then
       dm.privateWords[0] := StringtoInt(str1);
   end;
   procedure WriteCode;
     const
       SUBW_Op = $9079;           {  sub.w    <addr>, d0    }
       BPL_2_Op = $6a02;          {  bpl.s    +2            }
       NEG_D0_Op = $4440;           {   neg.w                  }
       CMPW_1to0_Op = $b041;      {  cmp.w    d1,d0         }
       BLT_Op = $6d00;            {  blt.s    +0            }
     var
       i, braNext: integer;
   begin
 { This still doesn't work because it doesn't call SetSixth() if the value doesn't change. }
     exit(WriteCode);
     Add_MoveImDn(dm.privateWords[0], 1);
     for i := 0 to dm.inputs - 1 do
       begin
         Add_MovetoD0(Ptr(dm.SlotsIn[i].ptrfrm));     {   move.w     <input>,d0; get new input
           }
         Add_MoveDntoDn(0, 2);                         {   move.w     d0,d2        ; minus last output
             }
```

-000656

```
      Add_Word(SUBW_Op);                           {  sub.w       <last>,d0
         }
      Add_Addr(@dm.PointsOut[i].LastValue);
      Add_Word(BPL_2_Op);                          {  bpl.s       +2          ; make positive
         }
      Add_Word(NEG_D0_Op);                         {  neg.w       d0
         }
      Add_Word(CMPW_1to0_Op);                      {  cmp.w       d1,d0       ; delta greater than
     step? }
      braNext := NextWord;
      Add_Word(BLT_Op);                            {  blt.s       foo         ;  no, ignore change
         }
      Add_MoveDntoDn(2, 0);                        {  move.w      d2,d0       ;  yes, save new
     last      }
      Add_D0toLastValue(dm.PointsOut[i]);          {  <save output code>
         }
      CodeHandle^^[braNext] := BOR(CodeHandle^^[braNext], (NextWord - braNext - 1) * 2);
     end;                                           { foo:
             }
  end;

 begin
  case v of
   initDM:           { Called once the first time this DM is started. }
    begin
     dm.private := nil;
     dm.privateWords[0] := 100;
     Calibrate;
    end;
   massageDM:        { Called once through the main loop. do a massage }
    begin
     doStep(dm);     { This shouldn't actually be called, massage is called directly. }
    end;
   closeDM:
    doClose(dm);                { Called at the end of the program run.  Do whatever... }
   reHookedDM:
    ;
   fopenDM:          { This DM has just been read from a file.  If it's state is }
                     { on it was hooked up properly.  private points to the }
    begin            { private memory it had when saved. }
     resetLast;
    end;
   fsaveDM:          { This DM is about to be saved to a file.  Do any changes }
    begin            { nessessary to private memory so it can be restored later. }
    end;
   calibDM:
    Calibrate;                  { Calibrate the DM module. }
   CalibPartDM:
    begin
     dm.privateWords[0] := DMverbMod;
    end;
   describeDM:
    describeStr := StringOf('Step by ', dm.privateWords[0] : 1);
```

```
    writeCodeDM:
      writeCode;
    otherwise        { Should be no other. }
      sysbeep(3);
   end;       { case }
  end;        { HandleStep }

{-----------------------------------------------------}
{ Two routines for a PassRaw DM module.  The first routine is called to handle }
{ one iteration of massage, the second routine is called to handle anything else }
{ about the module. }
 procedure doPass; { (var dm : DMRec) }
  var
   i: integer;
 begin
  for i := 0 to dm.inputs - 1 do
   with dm.PointsOut[i] do
    case outType of
     intD:
      begin
       LastValue.i := dm.SlotsIn[i].ptrfrm^.i;
       if ptrto <> nil then
        SetSixth(ptrto, ord(SixAxis), LastValue.i);
      end;
     longD, fixedD, realD:
      begin
       LastValue := dm.SlotsIn[i].ptrfrm^;
       if ptrto <> nil then
        SetSixthType(ptrto, ord(SixAxis), LastValue, outType);
      end;
     otherwise
      ;
    end;
 end;
{ HandlePass has all the routines nessessary to pass data from the rawData array }
{ to a point in the tree without any filtering.  It also writes code to do the same thing }
{ when passed the message writeCodeDM. }
 procedure HandlePass; { (v : DMVerb; var dm : DMRec) }
  var
   i: integer;
  procedure resetLast;
   var
    i: integer;
  begin
   for i := 0 to dm.outputs - 1 do
    dm.PointsOut[i].LastValue.i := 0;
  end;
 begin
  case v of
   initDM:           { Called once the first time this DM is started. }
    begin
     dm.private := nil;
    end;
```

```
    massageDM:          { Called once through the main loop.  do a massage }
      begin
        sysbeep(1);
        doPass(dm);       { This shouldn't actually be called, doPass is called directly. }
      end;
    closeDM:
      doClose(dm);              { Called at the end of the program run.  Do whatever... }
    reHookedDM:
      ;
    fopenDM:            { This DM has just been read from a file.  If it's state is }
                        { on it was hooked up properly.  private points to the }
      begin             { private memory it had when saved. }
        resetLast;
      end;
    fsaveDM:            { This DM is about to be saved to a file.  Do any changes }
      begin             { nessessary to private memory so it can be restored later. }
      end;
    calibDM:
      ;                 { Calibrate the DM module. }
    describeDM:
      ;
    writeCodeDM:
      begin
        for i := 0 to dm.inputs - 1 do
          case dm.PointsOut[i].outType of
            intD:
              begin
                Add_MovetoD0(Pointer(dm.SlotsIn[i].ptrfrm));
                Add_D0toLastValue(dm.PointsOut[i]);
              end;
            longD, fixedD, realD:
              begin
                Add_Word($2039);                {move.l  ptrfrm^,d0}
                Add_Addr(Ptr(dm.SlotsIn[i].ptrfrm));
                Add_D0toLastValue(dm.PointsOut[i]);
              end;
          end;
      end;
    otherwise           { Should be no other. }
      sysbeep(3);
  end;      { case }
end;        { HandlePass }

{ HandleMath handles math routines that have many inputs and one output.  It is only}
{ special in that the WriteCodeDM message looks up and tries to write the correct }
{ code for this DM. }
  procedure HandleMath; { (v : DMVerb; var dm : DMRec) }
    var
      i, opcode: integer;

    procedure WriteCode;
      var
        i: integer;
```

```
begin
  case dm.PointsOut[0].outType of
    intD:
      begin
        with dm do
          if massageProc = @doPlus then
            opcode := $d041      { add.w d1,d0 }
          else if massageProc = @doMinus then
            opcode := $9041      { sub.w d1,d0 }
          else if massageProc = @doTimes then
            opcode := $c1c1      { muls.w d1,d0 }
          else if massageProc = @doDiv then
            opcode := 0   {  $81c1  divs.w d1,d0 - can't do this because of divide by zero trap. }
          else if massageProc = @doBitAnd then
            opcode := $c041      { and.w d1,d0 }
          else if massageProc = @doBitOr then
            opcode := $8041      { or.w d1,d0 }
          else if massageProc = @doBitXor then
            opcode := $b340      { eor.w d1,d0 }
          else
            opcode := 0;
        if opcode <> 0 then
          begin
            Add_MovetoD0(Pointer(dm.SlotsIn[0].ptrfrm));          { d0 = input #0 }
            for i := 1 to dm.Inputs - 1 do
              begin
                Add_MovetoDn(Pointer(dm.SlotsIn[i].ptrfrm), 1);    { d1 = input #i }
                Add_Word(opcode);                                  { add.w d1,d0 or variation therof
    }
              end;
            Add_D0toLastValue(dm.PointsOut[0]);                  { save result }
          end;
      end;
    otherwise
      ;
  end;
end;

begin
  case v of
    massageDM:        { Called once through the main loop.  do a massage }
      begin
        sysbeep(1);
      end;
    writeCodeDM:
      WriteCode;
    otherwise
      GenericHandle(v, dm);
  end;      { case }
end;        { HandleMath }

{ An ExScript DM is one that executes a script with the same name as the DM }
{ whenever the input transits from zero to non-zero (leading edge).  On the }
```

```
{ transit from non-zero to zero (trailing edge) it does nothing.  Because that }
{ means it is primed when it's last input was 0, any resets, reloads, etc }
{ set it's last input to one.  So when you start up the program you have to }
{ bring its input low then high for it to do anything. }

  procedure doExScript;
   { This doesn't actually execute a script, just adds it to a list of scripts to execute at the end of the DM
       list.  That }
   { way you can safely execute scripts that add/delete DMs or even load new DM files. }
  begin
   with dm.PointsOut[0] do
    if (dm.SlotsIn[0].ptrfrm^.i <> 0) then
      begin
       if ((dm.PrivateWords[0] = 0) or (dm.PrivateWords[1] <> 0)) then
         begin
          ScriptListIdx := ScriptListIdx + 1;                   { Add the name to the list of scripts to
      execute. }
          ScriptList[ScriptListIdx] := dm.name;
          LastValue.i := 1;
         end
       else
         LastValue.i := 0;
       if ptrto <> nil then
         SetSixth(ptrto, ord(SixAxis), LastValue.i);
      end;
   dm.PrivateWords[0] := dm.SlotsIn[0].ptrfrm^.i;
  end;

  procedure HandleExScript; { (v : DMVerb; var dm : DMRec) }
   var
    i: integer;
   procedure Calib;
    var
     str:  str255;
   begin
    if dm.PrivateWords[1] <> 0 then
     str := 'True'
    else
     str := 'Leading Edge';
    if GetStrings('Fire if input is Leading edge or True?', '', str, str) then
     begin
      dm.PrivateWords[1] := ord(pos(str[1], 'tT') <> 0);
     end;
   end;
  begin
   case v of
    initDM:
     begin
      if dm.private <> nil then
        doClose(dm);
      dm.private := nil;
      dm.PrivateWords[0] := 1;
      dm.PrivateWords[1] := 0;
```

```
      Calib;
    end;
   fOpenDM:
    dm.PrivateWords[0] := 1;
   CalibDM:
    Calib;
   otherwise
    GenericHandle(v, dm);
  end;
 end;       { ExScriptHandle }

{-----------------------------------------------------}
{ PassIfTrueDM - 2 inputs, 1 output.  If input #2 is true then pass input #1 }
{ to output #1.  }
 procedure doPassIfTrue (var dm: DMRec);
  var
   i: integer;
 begin
  if dm.SlotsIn[1].ptrfrm^.i <> 0 then
   with dm.PointsOut[0] do
    case outType of
     intD:
      begin
       LastValue.i := dm.SlotsIn[0].ptrfrm^.i;
       if ptrto <> nil then
        SetSixth(ptrto, ord(SixAxis), LastValue.i);
      end;
     longD, fixedD, realD:
      begin
       LastValue := dm.SlotsIn[0].ptrfrm^;
       if ptrto <> nil then
        SetSixthType(ptrto, ord(SixAxis), LastValue, outType);
      end;
     otherwise
      ;
    end;
 end;
{-----------------------------------------------------}
{ FireOutput - 1 input, 6 outputs.  If input #1 is in the range 1..6 then}
{ set the corresponding output to true and all others to false. }
 procedure doFireOutput (var dm: DMRec);
  var
   i: integer;
 begin
  with dm.SlotsIn[0] do
   for i := 0 to maxDMOutput do
    with dm.PointsOut[i] do
     begin
      if ptrfrm^.i = i then
       LastValue.i := 1
      else
       LastValue.i := 0;
      if ptrto <> nil then
```

```
            SetSixth(ptrto, ord(SixAxis), LastValue.i);
        end;
    end;

end.
```

```
{ By Chuck Blanchard,  4/20/90 }
{ Copyright 1985 VPL Research, Inc.  All rights reserved}

{Tree procedures }

unit SinCosTree;

interface

 uses
  ChuckStuff, AutoLib, FastStuff, Globals, Tree3DGlob, MiscRoutines, formTree3D;

 procedure LoctoGlobRot (p: PRecPtr);
 procedure GlobtoLocRot (p: PRecPtr);
 procedure InitTestVec;

 procedure CalcSinCosPath (p: PRecPtr);
 procedure SinCosConvert (p: PRecPtr);


implementation

 var
  testVec, testVecYaw, testVecPitch, testVecRoll: PointRec;

 function SinCostoAngle (sine, cos: LongInt): LongInt;
  var
   Hype: real;
   angle: LongInt;
 begin
  if (sine = 0) and (cos = 0) then
   angle := 0
  else if true then
   begin
    Hype := sqrt(sine * sine + cos * cos);
    angle := Ang_arccos(cos / Hype);
    if sine > 0 then
     angle := 3600 - angle;
   end
  else
   angle := degRange(AngleProc(sine, cos, CSTBHandle^));
  SinCostoAngle := angle;
 end;


 procedure ShowSinCos (p: PRecPtr);
  var
   str: string;
 begin
  if true then
   begin
    with p^.sines do
```

```
      Announce(StringOf('"', p^.name, '", Sines: yaw= ', yaw : 1, ', pitch= ', pitch : 1, ', roll = ', roll :
      1));
    with p^.cosines do
      Announce(StringOf('Cosines: yaw= ', yaw : 1, ', pitch= ', pitch : 1, ', roll = ', roll : 1));
   end;
  with p^ do
   begin
    str := StringOf('Angles: yaw= ', SinCostoAngle(sines.yaw, cosines.yaw) / 10 : 3 : 1);
    str := StringOf(str, ', pitch= ', SinCostoAngle(sines.pitch, cosines.pitch) / 10 : 3 : 1);
    str := StringOf(str, ', roll= ', SinCostoAngle(sines.roll, cosines.roll) / 10 : 3 : 1);
    Announce(str);
   end;
 end;

 procedure pRotate (var pt: Point3d; t: RotTrip);
  { Rotate this point by the given translation triplicate. }
 begin
  with pt, t do
   begin
    if roll <> 0 then
      Rot(x, y, roll);
    if pitch <> 0 then
      Rot(y, z, pitch);
    if yaw <> 0 then
      Rot(x, z, yaw);
   end;
 end; { Rotate }

 procedure Add3Pt (var p1: Point3D; p2: Point3D);
{ Add two points and leave the result in the first point.  Hand coded for speed. }
 inline
  $205F,          { move.l  (a7)+,a0    a0 = frm point addr. }
  $225F,          { move.l  (a7)+,a1    a1 = to point addr.  }
  $3018,          { move.w  (a0)+,d0    get frm.x }
  $D159,          { add.w   d0,(a1)+    add to to.x }
  $3018,          { move.w  (a0)+,d0    get frm.y }
  $D159,          { add.w   d0,(a1)+    add to to.y }
  $3018,          { move.w  (a0)+,d0    get frm.z }
  $D159;          { add.w   d0,(a1)+    add to to.z }


 const
  VecSize = 1 * 1024;
  halfVec = VecSize div 2;

 procedure RotwithSine (var a, b: integer; sine, cosine: integer);
  var
   a1, b1: longInt;
 begin
  a1 := a;
  b1 := b;
  a := (a1 * (cosine) - b1 * (sine) + halfVec) div VecSize;
  b := (a1 * (sine) + b1 * (cosine) + halfVec) div VecSize;
```

04/12/90 14:37 ShowDM.pas Page 1

```
unit ShowDM;

interface

  uses
    FixMath, PrintTraps, AutoLib, ChuckStuff, Globals, Tree3DGlob, MiscRoutines, Tree3D, {}
    DMTypes, DMGlobals, FlexDraw, Flex;


  procedure doShow (var dm: DMRec);
  procedure HandleShow (v: DMVerb; var dm: DMRec);

implementation

  procedure doShow (var dm: DMRec);
    { do one massage on this dm. The inputs are valid and the outputs may or may not be nil. }
    var
      i: integer;
      str: string;
  begin
    str := '';
    with dm, PointsOut[0], SlotsIn[0] do
      if ptrfrm^.l <> LastValue.l then
        begin
          LastValue := ptrfrm^;
          case inType of
            intD:
              str := ntos(ptrfrm^.i);
            longD:
              str := ntos(ptrfrm^.l);
            fixedD:
              str := StringOf(Fix2X(ptrfrm^.f) : 3 : 4);
            realD:
              str := StringOf(ptrfrm^.r : 3 : 4);
            otherwise
              str := ntos(LongInt(StripAddress(@ptrfrm)));
          end;
          DisplayInDM(dm, str);
        end;
  end;

  procedure HandleShow (v: DMVerb; var dm: DMRec);
    { Handle all the other verbs for this dm. }

  begin
    case v of
      initDM:              { Called once the first time this DM is started. }
        begin
          if dm.private <> nil then
            doClose(dm);
        end;
      otherwise
```

-000666

```
      GenericHandle(v, dm);
    end;      { case }
  end;        { HandleShow }

end.
```

-000667

```
{ This is a colection of simple Data Massage Modules.  None of these use any }
{ private storage, they don't do any calibration and they all use GenericHandle to }
{ handle anything other than the massage data message. }

unit SimpleDMs;
interface
  uses
    FixMath, ChuckStuff, scottsStuff, FastStuff, Globals, AutoLib, Tree3DGlob, {}
    MiscRoutines, formTree3D, Tree3D, DMTypes, DMGlobals;

  var
    ScriptList: array[1..20] of NameStr;    { List of scripts that should be executed after DM list is done.
      }
    ScriptListIdx: integer;                  { Num of names in the list.  The list is added to by
        doExScript. }

  procedure doOneShot (var dm: DMRec);
  procedure doLeadingEdge (var dm: DMRec);

  procedure doPlus (var dm: DMRec);
  procedure doMinus (var dm: DMRec);
  procedure doTimes (var dm: DMRec);
  procedure doDiv (var dm: DMRec);

  procedure doPluses (var dm: DMRec);
  procedure doMinuses (var dm: DMRec);
  procedure doTimeses (var dm: DMRec);

  procedure doNot (var dm: DMRec);
  procedure doBoolean (var dm: DMRec);

  procedure doEqual (var dm: DMRec);
  procedure doNotEq (var dm: DMRec);
  procedure doGreaterThan (var dm: DMRec);
  procedure doLessThan (var dm: DMRec);
  procedure doGreaterEq (var dm: DMRec);
  procedure doLessEq (var dm: DMRec);
  procedure doBitNot (var dm: DMRec);
  procedure doBitAnd (var dm: DMRec);
  procedure doBitOr (var dm: DMRec);
  procedure doBitXor (var dm: DMRec);
  procedure doByteSwap (var dm: DMRec);
  procedure doNegDegree (var dm: DMRec);

  procedure doAveTwo (var dm: DMRec);
  procedure doAveby (var dm: DMRec);
  procedure HandleAveby (v: DMVerb; var dm: DMRec);
  procedure doLimit (var dm: DMRec);
  procedure HandleLimit (v: DMVerb; var dm: DMRec);
  procedure doStep (var dm: DMRec);
  procedure HandleStep (v: DMVerb; var dm: DMRec);
```

-000668

```
procedure doPass (var dm: DMRec);                { two routines for the PassRaw }
procedure HandlePass (v: DMVerb; var dm: DMRec);
procedure HandleMath (v: DMVerb; var dm: DMRec);
procedure HandleCompares (v: DMVerb; var dm: DMRec);

procedure doExScript (var dm: DMRec);            { two routines to handle script execution. }
procedure HandleExScript (v: DMVerb; var dm: DMRec);

procedure doPassIfTrue (var dm: DMRec);

procedure doFireOutput (var dm: DMRec);

implementation

{ All these DM's use the same handle code as PassRaw, just different }
{ routines to actually do the thing. }

 procedure doOneShot; { (var dm: DMRec) }
  { For all of its inputs, if they have changed since the last input then set the output to true, }
  { else set the ouput to false. }
  var
   i: integer;
 begin
  with dm do
   for i := 0 to inputs - 1 do
    with PointsOut[i] do
     begin
      LastValue.i := ord(SlotsIn[i].ptrfrm^.i <> privateWords[i]);
      privateWords[i] := SlotsIn[i].ptrfrm^.i;
      if ptrto <> nil then
       SetSixth(ptrto, ord(SixAxis), LastValue.i);
     end;
 end;

 procedure doLeadingEdge (var dm: DMRec);
  { For all of its inputs, if they have gone from 0 to non-zero then set the output to true, }
  { else set the ouput to false. }
  var
   i: integer;
 begin
  with dm do
   for i := 0 to inputs - 1 do
    with PointsOut[i] do
     begin
      if (privateWords[i] = 0) and (SlotsIn[i].ptrfrm^.i <> 0) then
       LastValue.i := 1
      else
       LastValue.i := 0;
      privateWords[i] := SlotsIn[i].ptrfrm^.i;
      if ptrto <> nil then
       SetSixth(ptrto, ord(SixAxis), LastValue.i);
     end;
 end;
```

```
{-------------------------------------------------------}
{      1-6 inputs, 1 output Math DM's                    }
{-------------------------------------------------------}

 procedure doPlus;
  var
   i: integer;
 begin
  with dm.PointsOut[0] do
   begin
    case outType of
     intD:
      begin
       LastValue.i := dm.SlotsIn[0].ptrfrm^.i;
       for i := 1 to dm.Inputs - 1 do
        LastValue.i := (LastValue.i + dm.SlotsIn[i].ptrfrm^.i);
      end;
     longD:
      begin
       LastValue.l := dm.SlotsIn[0].ptrfrm^.l;
       for i := 1 to dm.Inputs - 1 do
        LastValue.l := (LastValue.l + dm.SlotsIn[i].ptrfrm^.l);
      end;
     fixedD:
      begin
       LastValue.f := dm.SlotsIn[0].ptrfrm^.f;
       for i := 1 to dm.Inputs - 1 do
        LastValue.f := (LastValue.f + dm.SlotsIn[i].ptrfrm^.f);
      end;
     realD:
      begin
       LastValue.r := dm.SlotsIn[0].ptrfrm^.r;
       for i := 1 to dm.Inputs - 1 do
        LastValue.r := (LastValue.r + dm.SlotsIn[i].ptrfrm^.r);
      end;
     otherwise
      ;
    end;
    if ptrto <> nil then
     SetSixthType(ptrto, ord(SixAxis), LastValue, outType);
   end;
 end;

 procedure doMinus;
  var
   i: integer;
 begin
  with dm.PointsOut[0] do
   begin
    case outType of
     intD:
      begin
```

-000670

```
{ Swivel_Stuff is the unit that reads in swivel files and makes BE trees out of them. }
{ Copyright VPL Research, Inc. Chuck Blanchard, 10/89 }

unit Swivel_Stuff;

interface

  uses
    FixMath, ChuckStuff, FastStuff, AutoLib, Globals, Tree3DGlob, {}
    MiscRoutines, formTree3D, TreeEdit, Tree3D, DMTypes, DataMassage, Swivel_File_Format;


  function Import_Swivel: OSErr;
  procedure Init_Swivel;

implementation

  const
    SwBlankName = 'Object';      { A blank name in swivel is 'Objectxxx'. }
    BlankName = 'SwObject';      { Change them to 'SwObjectxxx' in BE so Isaac names don't conflict. }
    SwPref = 'Sw';               { Prefix for BE name of swivel blanknames. }
    RadtoDeg = 572.9577951;

  type
    Object_Ptr = ^Object_Record;
    Object_Handle = ^Object_Ptr;
  var
    oldTreePtr: TreeRecPtr;
    objVer: integer;

    { SetCrnt is in FileIO which is down in the build order because it has to know about Import_Swivel. So}
    { declare SetCrnt as external here and let the linker resolve the circular reference. }
  procedure SetCrnt (vRefNum: integer; fName: str255; ft: fileType);
  External;

  function ScaledPos (YoungPos, scaleby: LongInt): integer;
    var
      r: Real;
  begin
    case objVer of
      ObjVer132:
        r := (YoungPos / SCALE_132RANGE * scaleby) / 1024;
      ObjVer131:
        r := (YoungPos / SCALE_131RANGE * scaleby) / 1024;
      otherwise
        r := 0;
    end;
    if r < -32000 then
      r := -32000;
    if r > 32000 then
      r := 32000;
    ScaledPos := round(r);
```

-000671

```
end;

function ShouldDelete (p: PRecPtr): Boolean;
  { Return true if this node should be deleted because of it's name and it has nothing below it. }
begin
  ShouldDelete := false;
  if (p^.down = nil) then
    if (Pos(BlankName, p^.name) = 1) or (p^.name[1] = '_') then
      ShouldDelete := true;
end;

function BEcomment (oH: Object_Handle; command: string): boolean;
  { Return true if this swivel object has a comment with the given name.  For now }
  { a BE comment has the form BE<command> where case is sensitive. }
  var
    i: integer;
begin
  BEComment := false;
  command := concat('BE', command);
  for i := 1 to 8 do
    if EqualString(oH^^.OBJECT_COMMENTS[i], command, false, false) then
      begin
        BEcomment := true;
        leave;
      end;
end;

function BEinType (p: PRecPtr; oH: Object_Handle): SwivInType;
  { Return the swivel input type for this node based on the names in the Object comments. }
  { Also other fields of the point can be affected such as drawing lines down, right, name etc. }
{ Current valid BE commands in swivel comment fields: }
{ The first three either add/don't add new points in the tree to get the desired result. }
{   BEcube      - Add a bounding cube for this object down from the point. }
{   BEpoint     - Make this be just a point. }
{   BEline      - Add a line that goes through the greatest axis for this object down from the point. }
{ The rest affect the point state that you can affect in the Edit point dialog box. }
{   BELineDown  - Set Body Electric line down true. }
{   BELineRight - Set BE right line true. }
{   BEName      - Set BE showName true }
{   BEOutX, Y, Z, Roll, Pitch, Yaw - Set the appropriate serial out check box. }

  var
    i: integer;
    strp: StringPtr;
    str: str255;
  begin
    BEinType := TreeConfig.SwivIn;
    for i := 1 to 8 do
      begin
        strp := @oH^^.OBJECT_COMMENTS[i];
        if strp^ <> '' then
          if EqualString('be', copy(strp^, 1, 2), false, false) then
            begin
```

```
        str := strp^;
        UprString(str, false);
        if str = 'BECUBE' then
          BEinType := inCubes
        else if str = 'BELINE' then
          BEinType := inLines
        else if str = 'BEPOINT' then
          BEinType := inPoints
        else if str = 'BEBOUND' then
          BEinType := inBounds
        else if str = 'BELINEDOWN' then
          p^.Ldown := true
        else if str = 'BELINERIGHT' then
          p^.Lright := true
        else if str = 'BENAME' then
          p^.showName := true
        else if copy(str, 1, 5) = 'BEOUT' then
          with p^ do
            begin
              str := omit(str, 1, 5);
              if str = 'X' then
                flags := flags + [out0]
              else if str = 'Y' then
                flags := flags + [out1]
              else if str = 'Z' then
                flags := flags + [out2]
              else if str = 'ROLL' then
                flags := flags + [out3]
              else if str = 'PITCH' then
                flags := flags + [out4]
              else if str = 'YAW' then
                flags := flags + [out5];
            end;
      end;
  end;
end;

procedure MakeLines (p: PRecPtr; c: CUBE; offset: Point3; scaleBy: LongInt; swivIn: SwivInType);
  var
    face1, face2: PRecPtr;
    doX, doY, doZ: integer;
    oldpoly: integer;
    xdif, ydif: LongInt;

  procedure SetFacePoint2 (f1, f2: PRecPtr; x1, y1, x2, y2: LongInt);
  begin
    with f1^.ISix.pt do
      begin
        x := ScaledPos(x1, scaleby);
        y := ScaledPos(y1, scaleby);
      end;
    with f2^.ISix.pt do
      begin
```

-000673

```
      x := ScaledPos(x2, scaleby);
      y := ScaledPos(y2, scaleby);
    end;
  f1^.rBandPtr := f2;
end;

procedure SetPosition (p: PRecPtr; bigx, bigy, bigz: LongInt);
begin
  with p^.lSix.pt do
    begin
      x := ScaledPos(bigx, scaleby);
      y := ScaledPos(bigy, scaleby);
      z := ScaledPos(bigz, scaleby);
    end;
end;

begin
  oldpoly := TreeConfig.PolygonSize;
  with c do
    begin
      LessX := LessX - offset.XPOS;
      LessY := LessY - offset.YPOS;
      LessZ := LessZ - offset.ZPOS;
      GreatX := GreatX - offset.XPOS;
      GreatY := GreatY - offset.YPOS;
      GreatZ := GreatZ - offset.ZPOS;
      with p^.bound do
        begin          { Set the bounds cube that is now in the point }
          minPt.x := ScaledPos(LessX, scaleby);
          minPt.y := ScaledPos(LessY, scaleby);
          minPt.z := ScaledPos(LessZ, scaleby);
          maxPt.x := ScaledPos(GreatX, scaleby);
          maxPt.y := ScaledPos(GreatY, scaleby);
          maxPt.z := ScaledPos(GreatZ, scaleby);
        end;
    end;
  if swivIn = InLines then{ Make a line that spans the greatest dimension }
    with c do
      begin
        doX := 0;
        doY := 0;
        doZ := 0;
        If GreatX - LessX > GreatY - LessY then
          begin
            If GreatX - LessX > GreatZ - LessZ then
              doX := 1
            else
              doZ := 1;
          end
        else if GreatZ - LessZ > GreatY - LessY then
          doZ := 1
        else
          doY := 1;
```

-000674

```
{Link Types}

{  PosLock      =  %111 0000   }
   PosLock = $70;
{  XLock        = %100 0000 }
   XLock = $40;
{  YLock        = %010 0000 }
   YLock = $20;
{  ZLock        = %001 0000 }
   ZLock = $10;
{  AttLock          = %000 1110 }
   AttLock = $0E;
{  YawLock          = %000 1000 }
   YawLock = $08;
{  PitchLock        = %000 0100 }
   PitchLock = $04;
{  RollLock         = %000 0010 }
   RollLock = $02;
{  AllLock          = %111 1110 }
   AllLock = $7E;

{ Object Forms }
   path_form = 128;
   mesh_form = 129;
   pict_form = 130;      { not implemented }
   grid_form = 131;         { not implemented }
   op_form = 132;        { not implemented }

{ Section Types}
   UpTop_Section = 0;
   DownTop_Section = 1;
   UpSide_Section = 2;
   DownSide_Section = 3;
   Cross_Section = 3;


{ Degrees of Freedom }
{ }
{ Positions : }
{ }

 type

   Point3 = record
      ZPOS: LONGINT;  {Fixed Point Long Integer Scaled by Scale_Range}
      YPOS: LONGINT;  {Fixed Point Long Integer Scaled by Scale_Range}
      XPOS: LONGINT;  {Fixed Point Long Integer Scaled by Scale_Range}
     end;

 type
   Point2 = record
      YPOS: INTEGER;
      XPOS: INTEGER;
```

```
   end;

 type
   PosRange = record
      MinPos: LONGINT;     {Fixed Point Long Integer Scaled by Scale_Range}
      MaxPos: LONGINT;     {Fixed Point Long Integer Scaled by Scale_Range}
   end;


{•  Cosines : •}
 type
   Cosine = record
      Yaw_sin: LONGINT;   {Fixed Point Long Integer Scaled by COS_SCALE }
      Yaw_cos: LONGINT;   {Fixed Point Long Integer Scaled by COS_SCALE }
      Pitch_sin: LONGINT; {Fixed Point Long Integer Scaled by COS_SCALE }
      Pitch_cos: LONGINT; {Fixed Point Long Integer Scaled by COS_SCALE }
      Roll_sin: LONGINT;  {Fixed Point Long Integer Scaled by COS_SCALE }
      roll_cos: LONGINT;  {Fixed Point Long Integer Scaled by COS_SCALE }
   end;

{•  Angles•}
 type
   Angles = record
      Yaw: INTEGER;        {Degrees of rotation }
      Pitch: INTEGER;  {Degrees of rotation }
      Roll: INTEGER;       {Degrees of rotation }
   end;

 type
   AngleRange = record
      MinAngle: INTEGER;  {Minimum Degrees of rotation }
      MaxAngle: INTEGER; {Maximum Degrees of rotation }
   end;

{•  Cubes•}
 type
   CUBE = record
      GreatX: LONGINT;    {Fixed Point Long Integer Scaled by Scale_Range }
      LessX: LONGINT; {Fixed Point Long Integer Scaled by Scale_Range }
      GreatY: LONGINT;    {Fixed Point Long Integer Scaled by Scale_Range }
      LessY: LONGINT; {Fixed Point Long Integer Scaled by Scale_Range }
      GreatZ: LONGINT;    {Fixed Point Long Integer Scaled by Scale_Range }
      LessZ: LONGINT; {Fixed Point Long Integer Scaled by Scale_Range }
   end;

 { Object Types }


   S2Point = record
      XPOS: INTEGER;      { fixed INTEGER; scaled by ABS_GRAPHIC_SCALE }
      YPOS: INTEGER;      { fixed integer scaled by ABS_GRAPHIC_SCALE }
   end;
```

-000676

```
   S3Point = record
      XPOS: LONGINT;      {Fixed Point Long Integer Scaled by Scale_Range}
      YPOS: LONGINT;      {Fixed Point Long Integer Scaled by Scale_Range}
      ZPOS: LONGINT;      {Fixed Point Long Integer Scaled by Scale_Range}
    end;

   PathSec_Type = record
      case boolean of
        true: (
           SectionCount: LONGINT
        );
        false: (
           SectionPoint: S2Point
        );
    end;



{ The  Object.Record }
{ }
{ A Swivel object is stored in a SWIV Resource as an object record.  }
{ The Object.Record has Relative and Absolute Position  and Orientation  }
{ information. It has records internally which describe the object's range  }
{ of motion, constraints. }
{ }

  type

   Object_Record = record
      OBJECT_APP: ResType;          { to be valid always set to "SWVL" *}
      OBJECT_VERSION: INTEGER;        { to be valid for 1.1 set to 129 *}
      OBJECT_GROUP: INTEGER;          { reserved }
      OBJECT_INDEX: INTEGER;          { set to resource id number of object *}
      OBJECT_STRING:  packed array[1..22] of Char;   { no length byte *}
      OBJECT_LEVEL: INTEGER;          {level from world }
      OBJECT_REFLECT: INTEGER;        { reflectance scaled by REFLECT_SCALE *}
      OBJECT_RGBCOLOR: RGBColor;             {standard macII RGB, word of red, green and  blue each *}
      OBJECT_PALETTE_INDEX: Integer;
      OBJECT_COLOR_ENVIR: INTEGER;       { describes the last used color environment}
      OBJECT_ATRIBUTES1: array[1..192] of INTEGER;     {future  object  attributes}
      OBJECT_COMMENTS:  array[1..8] of string[31];
{ OBJECT_COMMENTS: array[1..128] of INTEGER; }
      OBJECT_RENDER: INTEGER;          { Set to a RenderStyle *}
      OBJECT_OPERATION: LONGINT;          { for future functionality, set to zero}
      OBJECT_A3POS: Point3;               {need not set default all zeros }
      OBJECT_R3POS: Point3;           {relative position, must be set *}
      OBJECT_R3CENTER: Point3;        {center of rotation in relative space *}
      OBJECT_A2POS: Point2;               { absolute position of object }
      START_R3POS: Point3;            { start pos for tweening }
      OBJECT_RECT: RECT;              { object 2d rectangle, need not set }
      OBJECT_RCUBE: CUBE;             { object relative 3d cube, }
      OBJECT_ACUBE: CUBE;             { object absolute 3d cube, }
```

-000677

```
      OBJECT_ACOS: Cosine;          { object Absolute cosines,}
      OBJECT_RCOS: Cosine;          { object relative cosines *}
      START_RCOS: Cosine;           { start cosine for tweening }
      ANGLE_DIFF: Angles;           {tweening difference in integer angle, yaw, pitch, and roll }
      POS_DIFF: Point3;          { tweening difference in position }
      OBJECT_SCALE: LONGINT;           {absolute object scale, scaled to Scale_Range}
      OBJECT_RSCALE: LONGINT;          {relative scale, with Scale_range 100% * }
      UP_TREE: INTEGER;          { index  of parent object *}
      DOWN_TREE: INTEGER;           { index of child object or THE_END*}
      RIGHT_TREE: INTEGER;          { index  of right sibling or THE_END*}
      LEFT_TREE: INTEGER;           {index of left sibling or THE_END *}
      LINK_TYPE: INTEGER;           {describes which links are locked }
      YAW_INPUT: INTEGER;           { for inputs from glove or sensors, set to zero }
      PITCH_INPUT: INTEGER;
      ROL_INPUT: INTEGER;
      YAW_RANGE: AngleRange;           { relative range of motion in Yaw }
      PITCH_RANGE: AngleRange;      { relative range of motion in Pitch }
      ROLL_RANGE: AngleRange;       { relative range of motion in Roll }
      X_RANGE: PosRange;      { relative range of motion in X }
      Y_RANGE: PosRange;          { relative range of motion in Y }
      Z_RANGE: PosRange;      { relative range of motion in Z }
      ATT_GRID: INTEGER;          {attitude grid in integer angle*}
      OBJECT_MEASURE_UNITS: LONGINT;           { number of measure units to a measure integer*}
      OBJECT_MEASURE_TO_SCREEN: LONGINT;            {  number of measure units to pixels *
                    fix_scale }
      OBJECT_FIXED_GRID: INTEGER;          { number of measure units to grid units*}
      OBJECT_INC_UNITS: INTEGER;           { number of measure units to grid lines *}
      POS_INPUTS: array[1..3] of INTEGER;   {reserved }
      SCALE_DIFF: LONGINT;          {scale difference for tweening }
      START_RSCALE: LONGINT;           { start tweening value for relative scale }
      OBJECT_ATTRIBUTES: array[1..12] of INTEGER;   {reserved }
      OBJECT_FORM: LONGINT;            { the object form code *}
      case integer of      { remaining bytes in form type *}
        path_form: (
           PathSections: array[0..0] of PathSec_Type;
        );
        mesh_form: (
           CrossSections: LONGINT;          { count of CrossSections in Mesh }
           CrossPoints: LONGINT;            { count of points in CrossSection }
           MeshArray: array[0..0] of S3Point;
        );
    end;

{ * Must be set if you are creating a object for swivel to render }

implementation

{ here is a function to pull a 3d point from a poly mesh object }

  function PullMeshPoint (obj: Object_Record; x, y: integer): S3Point;
  begin
    with obj do
      if OBJECT_FORM = mesh_form then
```

-000678

```
      PullMeshPoint := obj.MeshArray[(y * CrossPoints + x) * sizeof(S3Point)]
    else
      writeln('Not a Mesh Form in PullPoint!');
  end;


{ A path section is a singler unbounded array packed with 5 section arrays}
{ The length of each packed array is a SectionCount followed by that number of bytes in S2Points}
{ The first four arrays -always- have the same length, so the SectionCount found at }
{ obj.PathSections[1] is the length of the S2.Points in the first four arrays }
{ don't forget to add the section.count to the array length when indexing }

{ here is a function to pull a 2d point from a path object }
{ use a pathsection constant for the SectionType }

  function PullSectionPoint (obj: Object_Record; n: integer; SectionType: integer): S2Point;
  begin
    with obj do
      if OBJECT_FORM = path_form then
        PullSectionPoint := obj.PathSections[((obj.PathSections[0].SectionCount + sizeof(PathSec_Type)) *
         SectionType) + (n * sizeof(s2Point))].SectionPoint
      else
        writeln('Not a Path Form in PullSectionPoint!');
  end;


{ The UpTop and DownTop Sections are the poly segments found in the Top Section Quadrant}
{ in Swivel's Design Object View, the UpTop is the upper half of this Quadrant and }
{{ the DownTop is, of course, the lower, the SideSections follow the same idea. }
{ These sections determine the framework that the CrossSection is stretched over }
{ Swivel 1.00 uses PathSections to store objects because it is a compressed form }
{ Swivel 1.00 will render a PolyMeshes if you create them as a SWVL file or enter }
{ them as a command file }

{ the next fuction shows how to find the length of a given section }

  function SectionSize (obj: Object_Record; SectionType: integer): LongInt;
  begin
    with obj do
      if OBJECT_FORM = path_form then
        SectionSize := obj.PathSections[((obj.PathSections[0].SectionCount + sizeof(PathSec_Type)) *
         SectionType)].SectionCount
      else
        writeln('Not a Path Form in SectionSize!');
  end;

end.
```

```
  { Swivel 1.1 a8 File Format }
{ main changes are to the Constant GraphicScale, changed from 128 to 512 }
{ and the file version, now is 129 }
{ Edited by CLB on 12/16/88 to be a unit. }

unit Swivel_File_Format;

{ Swivel File Format }

interface


{File Types: }
{}
  const
    Application = 'SWVL';
    objectFile = 'SMDL';
    ObjVer131 = 131;   { for Swivel 1.0 - 1.4 }
    ObjVer132 = 132;   {increased 10/13/89 Swivel 1.5 and greater}
{Scratch File :    SMDS}


{Object Record : }
{Resource SWIV  1...255 }
    SwivelRes = 'SWIV';
{}
{ Each object is represented as a resource of ResType  SWIV in the resource }
{ fork of the file. The SWIV record is a single object in a tree. Its linking }
{ arrangements to other objects are described in the record by UP.TREE  }
{ DOWN.TREE RIGHT.TREE and LEFT.TREE these contain the resource IDs of other }
{ object in the tree.  Circular links or links to non-existant objects are  }
{ frowned upon. }
{  }
{ If you develop files for Swivel to read, you must follow the guidelines  }
{ in the file structure exactly. Since Swivel file formats are not a  }
{ standard, and are not represented as such, they may be changed to fit  }
{ the needs of new versions of Swivel and the community of users. We will  }
{ try to make you aware of this changes as they occur. }
{}
{}
{}
{Swivel objects or trees In a PICT as a picture comment : }
{}
{Pict Comment Opcode 100  ( the global comment ) }

  const
    Object_Kind = 128;
    Path_Kind = 129;    { not implemented }
    Poly_Kind = 130;        { not implemented }
    Lathe_Kind = 131;       { not implemented }
    Mesh_Kind = 132;   { not implemented }
    Grid_Kind = 133;{ not implemented }
    Op_Kind = 134;      { not implemented }
```

-000680

```
{ Each object is a comment of opcode 100 (global.comment) followed by the }
{ record itself. Notice that the structure of the record, with the }
{ application name first and 128 following (the object local.comment code }
{ for swivel ) supply the needed local picture comment opcode recommended }
{ by Apple. The internal linking of the commented swivel picture must follow }
{ hierachical rules. Swivel Objects of this type may be pasted from the }
{ scrapbook. The accompanying picture is drawn to a nil rect, and may be }
{ anything. See Apple technical descriptions for a PICT type II. }
{ }
{}
{}
{Reserved Objects }
{}
{   Resource SWIV number 1 is always the MetaWorld }
{   it is set to default values of }
{       0 yaw 0 pitch 0 roll }
{       0, 0, 0  x,y,z space }
{       Scale_Range Scale }
{}
{ Resource SWIV number 2 is always the World, and may be set to the }
{ current world orientation }
{ { Currently to be valid, a SWIV resource or object must be numbered between }
{ 1 and 255. }


{Scale Constants }
{ SCALE_RANGE = $100; object scale scaler for 1.4 and lower }

    SCALE_131RANGE = $100;     { object scale scaler for less than swivel 1.5 }
    SCALE_132RANGE = $10000;   { object scale scaler for swivel 1.5 and higher}

    FIX_RANGE = 1024; { fixed point scaler }
    COS_SCALE = $10000; { cosine fixed point scaler }
    GRAPHIC_SCALE = 512; { 2d fixed point scaler }
    NORMAL_SCALE = 64;  { screen scale of 2d normal cross section }
    ABS_GRAPHIC_SCALE = 2; { actual 2d graphic scale }
    REFLECT_SCALE = $80; { shading fixed pointer scaler }
    LAST_OBJECT = 255;  { last object in world, used as a scratch object }
    THE_END = -128;{ last object in world, used as a scratch object }

{Object IDs}
    META_WORLD = 1;  { primal object, of high ritual importance }
    WORLD_OBJECT = 2;{ the root object for the scene }

{Rendering Styles}
    WireFrame = 2;
    HiddenLine = 3;
    ShadedLine = 4;
    Shaded = 5;{this is the default }
    Contour = 6;
```

```
      mainTreePtr^.edPtr := p;
      TreeAddPoint(mainTreePtr, true, false);
      if (mainTreePtr^.edPtr <> nil) then
        begin
          mainTreePtr^.edPtr^.name := copy(concat(p^.name, '_line_'), 1, nameSize);
          SetPosition(mainTreePtr^.edPtr, 0, 0, 0);
          TreeAddPoint(mainTreePtr, true, false);
          SetPosition(mainTreePtr^.edPtr, LessX * doX, LessY * doY, LessZ * doZ);
          TreeAddPoint(mainTreePtr, false, true);
          SetPosition(mainTreePtr^.edPtr, GreatX * doX, GreatY * doY, GreatZ * doZ);
        end;
    end
  else if (swivIn = inBounds) then
    begin { Make two points that represent the bounding box for x,y,z. }
      mainTreePtr^.edPtr := p;
      TreeAddPoint(mainTreePtr, true, false);
      if (mainTreePtr^.edPtr <> nil) then
        with c do
          begin
            mainTreePtr^.edPtr^.name := copy(concat(p^.name, '_bounds_'), 1, nameSize);
            SetPosition(mainTreePtr^.edPtr, 0, 0, 0);
            TreeAddPoint(mainTreePtr, true, false);
            mainTreePtr^.edPtr^.name := copy(concat(p^.name, '_min_'), 1, nameSize);
            SetPosition(mainTreePtr^.edPtr, LessX, LessY, LessZ);
            TreeAddPoint(mainTreePtr, false, false);
            mainTreePtr^.edPtr^.name := copy(concat(p^.name, '_max_'), 1, nameSize);
            SetPosition(mainTreePtr^.edPtr, GreatX, GreatY, GreatZ);
          end;
    end
  else if swivIn = inCubes then
    begin
        { Make the name cube instead of bounds. }
      TreeConfig.PolygonSize := 4;
      mainTreePtr^.edPtr := p;
      TreeAddPoint(mainTreePtr, true, false);
      if (mainTreePtr^.edPtr <> nil) then
        begin
          mainTreePtr^.edPtr^.name := copy(concat(p^.name, '_cube_'), 1, nameSize);
          with mainTreePtr^.edPtr^.lSix.pt do
            begin
              x := 0;
              y := 0;
              z := 0;
            end;
          TreeAddObj(mainTreePtr);
          TreeAddObj(mainTreePtr);
          if (mainTreePtr^.edPtr <> nil) then
            begin
              face1 := p^.down^.down;
              face2 := face1^.right;
              with c do
                begin
                  SetPosition(face1, LessX, LessY, LessZ);
```

-000682

```
                SetPosition(face2, GreatX, GreatY, GreatZ);
              end;

            face1 := face1^.down;
            face2 := face2^.down;
            with c do
              begin
                xdif := GreatX - LessX;
                ydif := GreatY - LessY;
                SetFacePoint2(face1, face2, 0, 0, -xdif, -ydif);
                face1 := face1^.right;
                face2 := face2^.right;
                SetFacePoint2(face1, face2, 0, ydif, -xdif, 0);
                face1 := face1^.right;
                face2 := face2^.right;
                SetFacePoint2(face1, face2, xdif, ydif, 0, 0);
                face1 := face1^.right;
                face2 := face2^.right;
                SetFacePoint2(face1, face2, xdif, 0, 0, -ydif);
              end;
          end;
      end;
    TreeConfig.PolygonSize := oldPoly;
  end
end;

  { Return the angle value for this sin in Youngs file format. }
function AngArcsin (lsin: LongInt): integer;
  var
    r, s: real;
begin
  s := Fix2X(lsin);
  r := ArcTan(s / Sqrt(-(s * s) + 1));
  r := r * (180 / pi);
  AngArcsin := degRange(round(r * 10));
end;

function AngArccos (Lsin, Lcos: LongInt): integer;
  var
    r, cos: real;
begin
  cos := Fix2X(Lcos);
  r := round((-arctan(cos / sqrt(-(cos * cos) + 1)) + 1.5708) * RadtoDeg);
  if Lsin < 0 then
    r := 3600 - r;
  AngArccos := degRange(round(r));
end;

procedure SetPoint (p: PRecPtr; SwivH: Object_Handle; scaleby: LongInt);
{ Given a swivel object and a point record, use all the pertinent information in the }
{ swivel object to fill the point record. }
  var
    i: integer;
```

-000683

```
    nonspace: boolean;
    oldPoint: PRecPtr;

  function ScalePos (YoungPos: longInt): integer;
  begin
    ScalePos := ScaledPos(YoungPos, scaleby);
  end;
  procedure LockSix (axis, lockBit: integer);
  begin
      { Call SetSixth for every sixAxis to clip to constraints. }
    with p^, SwivH^^ do
      if (BAND(LINK_TYPE, lockBit) <> 0) then
        begin       { lock bit set, set constraints. }
          if false then
            Announce(StringOf('Locking axis # ', axis : 1, ' of ', name));
          mins.s[axis]  :=  p^.lSix.s[axis];
          maxs.s[axis]  :=  p^.lSix.s[axis];
        end;
  end;

begin
  HLock(Handle(SwivH));
  with SwivH^^, p^ do
    begin
      Name := '';
      nonspace := false;
      for i := nameSize downto 1 do
        begin
          if OBJECT_STRING[i] <> ' ' then
            nonspace := true;
          if nonspace then
            Name := concat(OBJECT_STRING[i], Name);
        end;
      if (Pos(SwBlankName, p^.name) = 1) then
        name := concat(SwPref, name);
      if oldTreePtr <> nil then
        begin
          { If a point with this name existed the use it to set the fields that BE has and Swivel doesn't. }
          oldPoint := FindTreeName(oldTreePtr, Name);
          if (oldPoint <> nil) and TreeConfig.MergeSwiv then
            begin
              flags := oldPoint^.flags;
              showName := oldPoint^.showName;
              Ldown := oldPoint^.Ldown;
              Lright := oldPoint^.Lright;
            end;
        end;
      lSix.pt.x := ScalePos(OBJECT_R3POS.XPOS);
      lSix.pt.x := ScalePos(OBJECT_R3POS.XPOS);
      lSix.pt.y := ScalePos(OBJECT_R3POS.YPOS);
      lSix.pt.z := ScalePos(OBJECT_R3POS.ZPOS);
      with OBJECT_RCOS do
        begin
```

-000684

```
        ISix.tt.roll := AngArccos(Roll_sin, Roll_cos);
        ISix.tt.pitch := AngArccos(Pitch_sin, Pitch_cos);
        ISix.tt.yaw := AngArccos(Yaw_sin, Yaw_cos);
      end;
    mins.pt.x := ScalePos(X_RANGE.MinPos);
    mins.pt.y := ScalePos(Y_RANGE.MinPos);
    mins.pt.z := ScalePos(Z_RANGE.MinPos);
    maxs.pt.x := ScalePos(X_RANGE.MaxPos);
    maxs.pt.y := ScalePos(Y_RANGE.MaxPos);
    maxs.pt.z := ScalePos(Z_RANGE.MaxPos);

    mins.tt.yaw := degRange(YAW_RANGE.MinAngle);
    mins.tt.pitch := degRange(PITCH_RANGE.MinAngle);
    mins.tt.roll := degRange(ROLL_RANGE.MinAngle);
    maxs.tt.yaw := degRange(YAW_RANGE.MaxAngle);
    maxs.tt.pitch := degRange(PITCH_RANGE.MaxAngle);
    maxs.tt.roll := degRange(ROLL_RANGE.MaxAngle);
    { Young does -180 to 180 for no constraints on degrees.  degRange converts that to }
    { 180 to 180 and my constraint algorithm limits that to only 180.  So change }
    { -180 to 180 into 0 to 359. }
    for i := 3 to 5 do
      if ((mins.s[i] = 1800) or (mins.s[i] = -1798)) and (maxs.s[i] = 1800) then
        begin
          mins.s[i] := 0;
          maxs.s[i] := 3599;
        end;
    if false then
      Announce(StringOf(name, ' ', LINK_TYPE));
    LockSix(0, XLock);
    LockSix(1, YLock);
    LockSix(2, ZLock);
    LockSix(3, YawLock);
    LockSix(4, PitchLock);
    LockSix(5, RollLock);
    ConstrainPt(p);      { Call ConstrainPt to clip to constraints. }
  end;
 HUnLock(Handle(SwivH));
 mainTreePtr^.edPtr := p;
end;

procedure Import_SubTree (p: PRecPtr; SwivH: Object_Handle; scaleby: LongInt);
 var
  up, down, right, left: integer;
  downH, rightH: Object_Handle;
  linedown, lineright: boolean;
  newscaleby: LongInt;
  p1: PRecPtr;
  inType: SwivInType;
begin
 with SwivH^^ do
  begin
   if (OBJECT_VERSION <> ObjVer132) and (OBJECT_VERSION <> ObjVer131) then
    exit(Import_SubTree);
```

-000685

```
      objVer := OBJECT_VERSION;
      up := UP_TREE;
      down := DOWN_TREE;
      right := RIGHT_TREE;
      left := LEFT_TREE;
      newscaleby := OBJECT_SCALE;
{   linedown := (LINK_TYPE <> 0) or p^.Ldown;}
      linedown := p^.Ldown;
      lineright := p^.Lright;
    end;
  ReleaseResource(Handle(SwivH));
  if down <> THE_END then
    downH := Object_Handle(Get1Resource(SwivelRes, down))
  else
    downH := nil;
  if right <> THE_END then
    rightH := Object_Handle(Get1Resource(SwivelRes, right))
  else
    rightH := nil;
  if downH <> nil then
    begin
      mainTreePtr^.edPtr := p;
      TreeAddPoint(mainTreePtr, true, linedown);
      objVer := downH^^.OBJECT_VERSION;
      p1 := mainTreePtr^.edPtr;
      inType := BEinType(p1, downH);
      SetPoint(p1, downH, newscaleby);
      MakeLines(p1, downH^^.OBJECT_RCUBE, downH^^.OBJECT_R3CENTER, downH^^.OBJECT_SCALE,
       inType);
      Import_SubTree(p1, downH, newscaleby);
    end;
  if rightH <> nil then
    begin
      mainTreePtr^.edPtr := p;
      TreeAddPoint(mainTreePtr, false, lineright);
      objVer := rightH^^.OBJECT_VERSION;
      p1 := mainTreePtr^.edPtr;
      inType := BEinType(p1, rightH);
      SetPoint(p1, rightH, scaleby);
      MakeLines(p1, rightH^^.OBJECT_RCUBE, rightH^^.OBJECT_R3CENTER, rightH^^.OBJECT_SCALE,
       inType);
      Import_SubTree(p1, rightH, scaleby);
    end;
      { If deleting blank names then do it here if this name is blank and there is nothing down. }
  if TreeConfig.DropUnnamed then
    if ShouldDelete(p) then
      begin
        mainTreePtr^.edPtr := p;
        TreeClear(mainTreePtr);
      end;
end;
```

```
{ Go through the old tree and look for named points.  If you find one and it's parent is named but you can't }
```

```
{ find a corresponding named point in the new tree just read in but you can find the parent then add this point
      }
{ into the new tree under the parent in the new tree. }
 procedure ChecktoMerge (p: PRecPtr);
   var
     p1, p2: PRecPtr;
 begin
   if p <> nil then
     begin
       if (p^.name <> '') and (p^.up^.name <> '') then
         begin
           p2 := FindTreeName(mainTreePtr, p^.name);
           if (p2 = nil) then
             begin
               p2 := FindTreeName(mainTreePtr, p^.up^.name);
               if p2 <> nil then
                 begin
                   p1 := InsertCopyofPt(mainTreePtr, p2, p);
                 end;
             end;
           ChecktoMerge(p^.down);
         end;
       ChecktoMerge(p^.right);
     end;
 end;

 { Go through the tree. If any points are named 'Objectxx' and all the subtrees from there are named }
 { Objectxx then delete the point and it's subtrees. }

 procedure DeleteBlankNames (p: PRecPtr);
   var
     p1, p2: PRecPtr;
 begin
   if p <> nil then
     begin
       DeleteBlankNames(p^.down);
       if ShouldDelete(p) then
         begin
           mainTreePtr^.edPtr := p;
           TreeClear(mainTreePtr);
         end;
       DeleteBlankNames(p^.right);
     end;
 end;

 function Import_Swivel: OSErr;
   const
     Tnum = 1;
   var
     TList: SFTypeList;
     Name: str255;
     i, err, vRef, oldvRef, resRef: integer;
     scaleRange: LongInt;
```

-000687

```
   WorldHandle: Object_Handle;
 begin
  Import_Swivel := noErr;
  TList[0] := objectFile;
  OldFileIdent2(Name, vRef, 'Swivel file to import?', Tnum, TList);
  if Name = '' then
   begin
    Import_Swivel := abortErr;
    exit(Import_Swivel);
   end;

  err := GetVol(nil, oldvRef);
  err := SetVol(nil, vRef);
  resRef := OpenResFile(Name);
  UseResFile(resRef);

  WorldHandle := Object_Handle(StripAddress(Ptr(Get1Resource(SwivelRes, WORLD_OBJECT))));
  if ResError <> noErr then
   begin
    Announce(StringOf('ResError opening WorldHandle = ', ResError : 1));
    Import_Swivel := ResError;
   end
  else
   begin
    case WorldHandle^^.OBJECT_VERSION of
     ObjVer132:
      scaleRange := SCALE_132RANGE;
     ObjVer131:
      scaleRange := SCALE_131RANGE;
     otherwise
      begin
       AnnounceB('Sorry, this is an old version Swivel File.');
       scaleRange := -1;
       Import_Swivel := abortErr;
      end;
    end;
    if scaleRange <> -1 then
     begin
      { Try to hang onto the existing tree }
      oldTreePtr := TreeRecPtr(NewPtr(sizeof(TreeRec)));
      if (oldTreePtr = nil) then
       begin
        Announce(StringOf('OldTree memory error #', MemError));
        Import_Swivel := MemError;
       end
      else
       begin
        initTree(oldTreePtr, false);
        mainTreePtr^.edPtr := mainTreePtr^.treeRoot;
        CopySubTree(mainTreePtr, oldTreePtr);
       end;

      { Make a new tree based on the swivel file we are importing. }
```

```
        NewTree(mainTreePtr);
        SetPoint(mainTreePtr^.treeRoot, WorldHandle, scaleRange);
        Import_SubTree(mainTreePtr^.treeRoot, WorldHandle, scaleRange);
        CheckTree(mainTreePtr, true);

        { If DropUnnamed is checked in tree options... then delete all the unnamed swivel nodes. }
        if false then
          if TreeConfig.DropUnnamed then
            DeleteBlankNames(mainTreePtr^.treeRoot);

        { If Merge swivel tree is checked in tree options... then merge the old and the new. }
        if oldTreePtr <> nil then
          begin
            if TreeConfig.MergeSwiv then
              begin
                oldTreePtr^.treeRoot^.down^.name := oldTreePtr^.treeRoot^.name;
                ChecktoMerge(oldTreePtr^.treeRoot^.down);
              end;
            DisposeTree(oldTreePtr);
          end;
        IsaacFName := ExFileName(Name, 'isaac');
        if not TreeConfig.MergeSwiv then
          SetCrnt(vRef, ExFileName(Name, 'tree'), treeFile);
        HookupFlag := true; { Signal that DM's need to be rehooked up. }
        err := postevent(app1Evt, 4); { should be LoadedTreeMsg }
      end;        { wasn't an old version swivel file }
    end;        { got the WorldHandle resource }
  mainTreePtr^.dirty := true;

  CloseResFile(resRef);
  err := SetVol(nil, oldvRef);
 end;    { Import_Swivel }

 procedure Init_Swivel;
  var
    i: integer;
 begin
 end;
end.
```

```
{ This unit handles Scale/Offset Data Massage Modules.  Thats all it does. }
{ A Scale/Offset module lets you set a real number to scale the raw value by and }
{ an integer offset to add to the number after it has been scaled. }

{$setc newScale=true }

unit SomeDMs;
interface
  uses
    SANE, FixMath, ChuckStuff, scottsStuff, iop_calls, AutoLib, FastStuff, Globals, Tree3DGlob, {}
    MiscRoutines, DataFlash, Tree3D, formTree3D, DMTypes, DMGlobals;

  procedure doScale (var dm: DMRec);
  procedure HandleScale (v: DMVerb; var dm: DMRec);
  procedure doSmooth (var dm: DMRec);
  procedure HandleSmooth (v: DMVerb; var dm: DMRec);
  procedure doOneExp (var dm: DMRec);
  procedure HandleOneExp (v: DMVerb; var dm: DMRec);

  procedure doWrtFlash (var dm: DMRec);
  procedure HandleWrtFlash (v: DMVerb; var dm: DMRec);
  procedure doconst (var dm: DMRec);
  procedure HandleConst (v: DMVerb; var dm: DMRec);

implementation

  const
    smallTabBound = 255;
    bigTabBound = 1023;

  type
    { Private storage for a Scale/Offset DM. }
    ScalePvtType = record
        scaleby: Fixed;
        offsetby: integer;
      end;
    ScalePvtPtr = ^ScalePvtType;
    Scale2PvtType = record
        scaleby: DRec;
        offsetby: DRec;
        scaleType: Dtype;
      end;
    Scale2PvtPtr = ^Scale2PvtType;

    AngTabType = array[0..smallTabBound] of integer;     { One angle table }
    AngTabPtr = ^AngTabType;

    BigAngTabType = array[0..bigTabBound] of integer;        { One angle table }
    BigAngTabPtr = ^BigAngTabType;

    tablesType = array[0..5] of AngTabType;
    tablesPtrType = ^tablesType;
```

```
    bigtablesType = array[0..5] of bigAngTabType;
    bigtablesPtrType = ^bigtablesType;
    { Private storage for a OneExp DM. }
    ExpPvtType = record
        firstAng, secondAng, minAng, maxAng: integer;
        case boolean of
          true: (
              tables: tablesType;
          );
          false: (
              bigtables: bigTablesType;
          );
      end;
    ExpPvtPtr = ^ExpPvtType;

  var
    globK: integer;

{$ifc newScale }
{-----------------------------------------}
{ This is the new version of the Scale/Offset DM.  I moved the scale and offset into PrivateWords, changed }
{ it so it can have int,long,fixed or real inputs and outputs and rewrote the code that it generates.  CLB
        12/27/89.  }
  procedure doScale (var dm: DMRec);
    var
      i: integer;
      sptr: Scale2PvtPtr;
      f: Fixed;
      r: Real;
  begin
    sptr := Scale2PvtPtr(@dm.PrivateWords);
    for i := 0 to dm.inputs - 1 do
      with dm, dm.PointsOut[i], dm.SlotsIn[i] do
        begin
          if sptr^.scaleType = realD then
            begin
              case inType of
                intD:
                  r := ptrfrm^.i;
                longD:
                  r := ptrfrm^.l;
                fixedD:
                  r := Fix2X(ptrfrm^.f);
                realD:
                  r := ptrfrm^.r;
              end;
              r := r * sptr^.scaleby.r + sptr^.offsetby.r;
              case outType of
                intD:
                  LastValue.i := Round(r);
                longD:
                  LastValue.l := Round(r);
                fixedD:
```

-000691

```
          LastValue.f := X2Fix(r);
        realD:
          LastValue.r := r;
      end;
    end              { scaler is real }
  else
    begin
      case dm.SlotsIn[i].inType of
        intD:
          f := Long2Fix(SlotsIn[i].ptrfrm^.i);
        longD:
          f := Long2Fix(SlotsIn[i].ptrfrm^.l);
        fixedD:
          f := SlotsIn[i].ptrfrm^.f;
      end;
      f := FixMul(f, sptr^.scaleby.f) + sptr^.offsetby.f;
      case outType of
        intD:
          LastValue.i := FixRound(f);
        longD:
          LastValue.l := Fix2Long(f);
        fixedD:
          LastValue.f := f;
      end;
    end;  { scaler is fixed. }
  if ptrto <> nil then
    SetSixthType(ptrto, ord(SixAxis), LastValue, outType);
 end;      { for i, with }
end;{ doScale }

{ HandleScale has all the routines nessessary to pass data from the rawData array }
{ to a point in the tree after scaling and offseting them. }
 procedure HandleScale (v: DMVerb; var dm: DMRec);

  var
   i: integer;
   h: handle;
   sptr: Scale2PvtPtr;
   oldsptr: ScalePvtPtr;

  procedure CheckType;
    { Check the DM's input and output types to see if this should be a real or fixed scale/offset. }
    { If is should be different than what it is then change it.}
   var
    dt: Dtype;
    sptr: Scale2PvtPtr;
    i: integer;
  begin
   sptr := Scale2PvtPtr(@dm.PrivateWords);
   dt := fixedD;
   for i := 0 to dm.inputs - 1 do
     with dm, dm.PointsOut[i], dm.SlotsIn[i] do
       if (inType in [longD, realD]) or (outType = realD) then
```

-000692

```
        dt := realD;
    if dt <> sptr^.scaleType then
      begin
        if false then
          Announce(StringOf('CheckType: change scaleType for dm "', dm.name, '".'));
        if dt = realD then
          begin        { change fixed scaletype to real scaletype. }
            sptr^.scaleby.r := Fix2X(sptr^.scaleby.f);
            sptr^.offsetby.r := Fix2X(sptr^.offsetby.f);
          end
        else
          begin
            sptr^.scaleby.f := X2Fix(sptr^.scaleby.r);
            sptr^.offsetby.f := X2Fix(sptr^.offsetby.r);
          end;
        sptr^.scaleType := dt;
        DMCodeInvalid := true;       { set global invalid so the DM code will be regenerated. }
      end;
  end;

  procedure Calibrate (var dm: DMRec);
    var { calibrate this Scale/Offset dm. }
      sptr: Scale2PvtPtr;
      prompt1, str1, str2: str255;
  begin
    CheckType;
    sptr := Scale2PvtPtr(@dm.PrivateWords);
    if sptr^.scaleType <> realD then
      begin
        str1 := StringOf(Fix2X(sptr^.scaleby.f) : 5 : 5);
        str2 := StringOf(Fix2X(sptr^.offsetby.f) : 5 : 5);
        prompt1 := 'Fixed ';
      end
    else
      begin
        str1 := StringOf(sptr^.scaleby.r : 5 : 5);
        str2 := StringOf(sptr^.offsetby.r : 5 : 5);
        prompt1 := 'Real ';
      end;
    prompt1 := concat(prompt1, 'Scale/Offset DM module "', dm.name, '".');
    prompt1 := concat(prompt1, chr(13), 'Enter the new scale value:');
    if GetStrings(prompt1, 'And the new offset value:', str1, str2) then
      begin
        if sptr^.scaleType <> realD then
          begin
            sptr^.scaleby.f := X2Fix(StringtoReal(str1));
            sptr^.offsetby.f := X2Fix(StringtoReal(str2));
          end
        else
          begin
            sptr^.scaleby.r := StringtoReal(str1);
            sptr^.offsetby.r := StringtoReal(str2);
          end;
```

-000693

```
      FileDirty[dmFile] := true;
    end;
  end;

  procedure Fixed_Code (sptr: Scale2PvtPtr);
    { D0.f has a 32 bit fixed number. sptr^.scaleby and sptr^.offset are fixed. Write code to multiply and
    }
    { add them to D0 and leave the resultant fixed in D0. }
  begin
    Add_Word($2400);                          {move.l d0,d2}
    if sptr^.scaleby.f >= 0 then
      Add_Word($7000)                         {moveq #0,d0}
    else
      Add_Word($70FF);                        {moveq #-1,d0}
    Add_Word($223C);                              {move.l #scaleby,d1}
    Add_Addr(Pointer(sptr^.scaleby.f));
    Add_Word($4c02);                          {muls.l d2, d1:d0}
    Add_Word($1c00);
    Add_Word($4841);                              {swap d1}
    Add_Word($4840);                              {swap d0}
    Add_Word($3001);                              {move.w d1,d0}
    Add_Word($D0BC);                              {add.l #offset,d0}
    Add_Addr(Pointer(sptr^.offsetby.f));
  end;

begin
  case v of
    initDM:           { Called once the first time this DM is started. }
      begin
        doClose(dm);
        sptr := Scale2PvtPtr(@dm.PrivateWords);
        sptr^.scaleType := fixedD;
        sptr^.scaleby.f := hLong(1);
        sptr^.offsetby.f := 0;
        Calibrate(dm);
      end;
    massageDM:        { This message shouldn't be passed, but here for historical reasons. }
      doScale(dm);
    closeDM:          { Called when this module is deleted. Do whatever... }
      doClose(dm);
    reHookedDM:
      CheckType;      { DM has been re-hooked up, check to see if it's type is ok. }
    fopenDM:
      begin                       { This DM has just been read from a file. If private <> nil it is an
       old style }
        if dm.private <> nil then
          begin { scale/offset dm. Convert it. }
            sptr := Scale2PvtPtr(@dm.PrivateWords);
            oldsptr := ScalePvtPtr(dm.private);
            sptr^.scaleby.f := oldsptr^.scaleby;
            sptr^.offsetby.f := HLong(oldsptr^.offsetby);
            sptr^.scaleType := fixedD;
            h := RecoverHandle(dm.private);
```

```
          DisposHandle(h);
          dm.private := nil;
        end;
      CheckType;
    end;
   fsaveDM:          { This DM is about to be saved to a file.  Do any changes }
    begin            { nessessary to private memory so it can be restored later. }
    end;
   calibDM:          { Calibrate the DM module. }
    begin
      Calibrate(dm);
    end;
   describeDM:       { put a description into describeStr }
    begin
      sptr := Scale2PvtPtr(@dm.PrivateWords);
      case sptr^.scaleType of
        fixedD:
          begin
            describeStr := StringOf('Fixed Scale: ', Fix2X(sptr^.scaleby.f) : 5 : 5);
            describeStr := StringOf(describeStr, ', Offset: ', Fix2X(sptr^.offsetby.f) : 5 : 5);
          end;
        realD:
          begin
            describeStr := StringOf('Real Scale: ', sptr^.scaleby.r : 5 : 5);
            describeStr := StringOf(describeStr, ', Offset: ', sptr^.offsetby.r : 5 : 5);
          end;
      end;
    end;
   writeCodeDM:
    begin
      sptr := Scale2PvtPtr(@dm.PrivateWords);
{$ifc Option(MC68881) }
        { This should more properly use MC68020 but for now assume that if there is a 68881 there's
      also a 68020. }
      if sptr^.scaleType = fixedD then
        begin
          Add_Word($4E71);    { nop as a flag }
          for i := 0 to dm.inputs - 1 do
            with dm, dm.PointsOut[i], dm.SlotsIn[i] do
              begin
                case inType of      { First, translate the input into a Fixed in D2. }
                  intD:
                    begin
                      Add_Word($7000);                    {moveq #0,d0}
                      Add_MovetoD0(Pointer(ptrfrm));      { move.w in, d0 }
                      Add_Word($4840);                    {swap d0}
                    end;
                  longD:
                    begin
                      Add_Word($7000);                      {moveq #0,d0}
                      Add_Word($3039);                    { move.w <inaddr+2>, d0 }
                      Add_Addr(Ptr(ord4(ptrfrm) + 2));
                      Add_Word($4840);                    {swap d0}
```

-000695

```
                    end;
                  fixedD:
                    begin
                      Add_Word($2039);                { move.l <inaddr>, d0 }
                      Add_Addr(Ptr(ptrfrm));
                    end;
                end;
                Fixed_Code(sptr);      { mul D0.f * scaleby.f, add offsetby.f and leave in D0.f. }
                case outType of        { now translate D0 to either an int or long if appropriate. }
                  intD, longD:
                    begin
                      Add_Word($D0BC);                {add.l #$8000,d0 - round up by adding .5.  }
                      Add_Word($0000);
                      Add_Word($8000);
                      Add_Word($9040);                {sub.w d0,d0 - clear out the lower word. }
                      Add_Word($4840);                {swap d0 - now high word is zero, either a
     long or int. }
                    end;
                  otherwise
                    ;
                end;
                Add_D0toLastValue(dm.PointsOut[i]);   { save result.  Its either D0.i, D0.l or D0.f. }
              end;
          Add_Word($4E71);     { nop as a flag }
        end;
{$endc }
      end;
    otherwise          { Should be no other. }
      sysbeep(3);
  end;     { case }
end;       { HandleScale }

{$elsec }
{------------------------------------------}
{ Old version of Scale/Offset.  Could only have integer inputs and outputs. }
 procedure FastScale;
 external;

 procedure doScale; { (var dm : DMRec) }
  var
   i: integer;
   r: real;
   sptr: ScalePvtPtr;
 begin
  sptr := ScalePvtPtr(dm.private);
  for i := 0 to dm.inputs - 1 do
   with dm, dm.PointsOut[i] do
    begin
     LastValue.i := fRound(FixMul(hLong(SlotsIn[i].ptrfrm^.i), sptr^.scaleby)) + sptr^.offsetby;
     if ptrto <> nil then
      SetSixth(ptrto, ord(SixAxis), LastValue.i);
    end;
 end;
```

```
{ HandleScale has all the routines nessessary to pass data from the rawData array }
{ to a point in the tree after scaling and offseting them. }
 procedure HandleScale; {•(v : DMVerb;•}
                        {•    var dm : DMRec);•}

  var
   i: integer;
   h: handle;
   sptr: ScalePvtPtr;

  procedure Calibrate (var dm: DMRec);
   var { calibrate this Scale/Offset dm. }
    sptr: ScalePvtPtr;
    prompt1, str1, str2: str255;
    r: extended;
  begin
   sptr := ScalePvtPtr(dm.private);
   prompt1 := concat('Scale/Offset DM module "', dm.name, '".');
   prompt1 := concat(prompt1, chr(13), 'Enter the new scale value:');
   if sptr = nil then
    Announce('Error, private pointer is nil.')
   else
    begin
     str1 := StringOf(Fix2X(sptr^.scaleby) : 5 : 5);
     str2 := StringOf(sptr^.offsetby : 1);
     if GetStrings(prompt1, 'And the new offset value:', str1, str2) then
      begin
       if str1 <> '' then
        begin
         r := StringtoReal(str1);
         sptr^.scaleby := X2Fix(r);
        end;
       if str2 <> '' then
        sptr^.offsetby := StringtoInt(str2);
       FileDirty[dmFile] := true;
      end;
    end;
  end;

 begin
  case v of
   initDM:            { Called once the first time this DM is started. }
    begin
     if dm.private <> nil then
      doClose(dm);
     h := NewHandle(sizeof(ScalePvtType));
     if h <> nil then
      begin
       MoveHHi(h);
       HLock(h);
       dm.private := h^;
       sptr := ScalePvtPtr(dm.private);
       sptr^.scaleby := hLong(1);
```

```
        sptr^.offsetby := 0;
        Calibrate(dm);
      end
    else
      begin
        Announce('Not enough memory to open this Scale/Offset DM');
        dm.state := usrOff;
      end;
  end;
 massageDM:         { Called once through the main loop. do a massage }
  doScale(dm);
 closeDM:           { Called when this module is deleted. Do whatever... }
  doClose(dm);
 reHookedDM:
  ;                 { DM has been re-hooked up. who cares? }
 fopenDM:           { This DM has just been read from a file. If it's state is }
                    { on it was hooked up properly. private points to the }
  begin             { private memory it had when saved. }
  end;
 fsaveDM:           { This DM is about to be saved to a file. Do any changes }
  begin             { nessessary to private memory so it can be restored later. }
  end;
 calibDM:           { Calibrate the DM module. }
  begin
    Calibrate(dm);
  end;
 describeDM:        { put a description into describeStr }
  begin
    sptr := ScalePvtPtr(dm.private);
    describeStr := StringOf('Scale: ', Fix2X(sptr^.scaleby) : 5 : 5);
    describeStr := StringOf(describeStr, ', Offset: ', sptr^.offsetby : 1);
  end;
 writeCodeDM:
  begin
    sptr := ScalePvtPtr(dm.private);
    if true then
     for i := 0 to dm.inputs - 1 do
       begin
         Add_Word($343c);                              { move.w offsetby, d2 }
         Add_Word(sptr^.offsetby);
         Add_Word($223c);                              { move.l  scaleby, d1 }
         Add_Addr(Pointer(sptr^.scaleby));
         Add_MovetoD0(Pointer(dm.SlotsIn[i].ptrfrm));  { move.w in, d0 }
         Add_Word(JSR_ABS_Op);                         { jsr FastScale }
         Add_Addr(@FastScale);
         Add_D0toLastValue(dm.PointsOut[i]);           { save result }
       end;
  end;
 otherwise          { Should be no other. }
  sysbeep(3);
 end;     { case }
end;      { HandleScale }
{$endc }
```

-000698

```
{-----------------------------------------}
 procedure doSmooth; { (var dm : DMRec) }
   var
     i, thresh: integer;
 begin
   thresh := dm.PrivateWords[0];
   for i := 0 to dm.inputs - 1 do
     with dm, dm.PointsOut[i] do
       begin
         LastValue.i := MinMaxOf(LastValue.i - thresh, SlotsIn[i].ptrfrm^.i, LastValue.i + thresh);
         if ptrto <> nil then
           SetSixth(ptrto, ord(SixAxis), LastValue.i);
       end;
 end;
{ HandleSmooth has all the routines nessessary to handle a smooth DM.  This doesn't }
{ let it's output change from it's input by more than a user setable threshold. }
 procedure HandleSmooth;  {•(v  :  DMVerb;•}
                          {•     var dm : DMRec);•}

   var
     i: integer;
     r: real;
     h: handle;
     ip: IntPtr;

   procedure Calibrate (var dm: DMRec);
     var { calibrate this Smooth dm. }
       prompt1, str1, str2: str255;
       i: integer;
   begin
     prompt1 := concat('Smooth DM module "', dm.name, '".');
     prompt1 := concat(prompt1, chr(13), 'Enter the new smoothing Threshold:');
     str1 := StringOf(dm.PrivateWords[0] : 1);
     if GetStrings(prompt1, '', str1, str2) then
       dm.PrivateWords[0] := StringtoInt(str1);
     for i := 0 to dm.outputs - 1 do
       dm.PointsOut[i].LastValue.i := 0;
   end;

  begin
   case v of
     initDM:            { Called once the first time this DM is started. }
       begin
         if dm.private <> nil then
           doClose(dm);
         dm.PrivateWords[0] := 10;
         Calibrate(dm);
       end;
     massageDM:         { Called once through the main loop.  do a massage }
       doScale(dm);
     closeDM:           { Called when this module is deleted.  Do whatever... }
       doClose(dm);
```

-000699

```
    fopenDM:          { This DM has just been read from a file.  If it's state is }
                      { on it was hooked up properly.  private points to the }
      begin           { private memory it had when saved. }
        if dm.private <> nil then
          begin { old smoothing dm's had the threshold in one integer of private storage. }
            ip := IntPtr(dm.private);
            dm.PrivateWords[0] := ip^;
            h := RecoverHandle(dm.private);
            DisposHandle(h);
            dm.private := nil;
          end;
        for i := 0 to dm.outputs - 1 do
          dm.PointsOut[i].LastValue.i := 0;
      end;
    reHookedDM, fsaveDM:
      ;
    calibDM:          { Calibrate the DM module. }
      begin
        Calibrate(dm);
      end;
    describeDM:
      begin
        describeStr := StringOf('Smooth threshold: ', dm.PrivateWords[0] : 1);
      end;
    writeCodeDM:
      ;
    otherwise         { Should be no other. }
      sysbeep(3);
  end;      { case }
end;        { HandleSmooth }

{--------------------------------------------------}
{ Routines for a OneExp DM module.                 }
{--------------------------------------------------}

  function CalcCurve (firstRaw, firstAng, secRaw, secAng, minAng, maxAng: integer; var bt:
        BigAngTabType; tableBound: integer): boolean;
{ Given two points, calculate an exponential curve fit from them.  Fill the }
{ calibration table for the given joint with the angles calculated from the curve. }
{ Curve fit algorithm by the wizardry of Steve Bryson 10/86 }
{ Abort and return false if the user types command '.' }
{ modified for DataSuit.  minAng is the minimum angle to generate, maxAng is the }
{ max angle to generate. }
    const
      inc = 6;
    var
      a, b, angle, k, fred: extended;
      i, j, x1, x2, y1, y2, raw: integer;
      str: Str255;
      fa, fb, fx: Fixed;
      event: EventRecord;
      go: boolean;
      e: exception;
```

```
    slope: Fixed;

  begin
{$ifc Option(MC68881) = false }
    ProcEntry(e);
{$endc }
    SetCursor(ClockCurs^^);
    go := true;
    if false then
      begin
        k := ln(firstRaw / (firstRaw - secRaw)) / (secAng - firstAng);
        k := globK;
        writeln(k : 3 : 5, ' ', firstraw : 1, ' ', secraw : 1, ' ', firstAng : 1, ' ', secAng : 1);
        for raw := 0 to 255 do
          begin
            angle := (secAng - firstAng) * exp(-(raw - secRaw) / k);
            fred := exp(-(raw - firstraw + 15));
            if fred > 1 then
              fred := 1;
            if fred < 0 then
              fred := 0;
            bt[raw] := MinMaxOf(minAng, round(angle * fred), maxAng);
          end;
      end
    else
      begin
        if firstRaw = 0 then
          firstRaw := 1;
        if secRaw = 0 then
          secRaw := 1;
        b := ln(firstRaw / secRaw) / (firstAng - secAng);
        a := secRaw * exp(-b * secAng);
        x1 := 0;
        y1 := round(ln(1 / a) / b);
        bt[x1] := MinMaxOf(minAng, y1, maxAng);
        for i := 1 to (tableBound div inc) + 1 do
          if go then
            begin
              x2 := x1 + inc;
              y2 := round(ln(x2 / a) / b);
              slope := FixRatio(y2 - y1, inc);
              fa := BitShift(y1, 16);
              if x2 < tableBound + 1 then
                bt[x2] := MinMaxOf(minAng, y2, maxAng)
              else
                x2 := TableBound + 1;
              for j := x1 + 1 to x2 - 1 do
                begin
                  fa := fa + slope;
                  bt[j] := MinMaxOf(minAng, FixRound(fa), maxAng);
                end;
              x1 := x2;
              y1 := y2;
```

```
          if GetNextEvent(keyDownMask, event) then
            begin
              if (BitAnd(event.modifiers, cmdKey) <> 0) then
                if (BitAnd(event.message, $FF) = ord('.')) then
                  go := false;
            end;
        end;
    end;
   InitCursor;
   CalcCurve := go;
{$ifc Option(MC68881) = false }
   SetException(e, false);
   SetEnvironment(e);
{$endc }
 end;    { CalcCurve }

 function CalcLinear (lRaw, lAng, hRaw, hAng, minAng, maxAng: integer; var btab: BigAngTabType;
      tableBound: integer): boolean;
{ Given two points, calculate an linear curve fit from them.  Fill the }
{ calibration table for the given joint with the angles calculated from the curve. }
{ modified from CalcCurve }
   var
     i: integer;
     fa, slope: Fixed;
     rslope, rstart: real;
     e: exception;

 begin
{$ifc Option(MC68881) = false }
   ProcEntry(e);
{$endc }
   SetCursor(ClockCurs^^);
   rslope := (lAng - hAng) / (lRaw - hRaw);
   rstart := lAng - lRaw * (rslope);
   slope := X2Fix(rslope);
   fa  := X2Fix(rstart);
   for i := 0 to tableBound do
     begin
       btab[i] := MinMaxOf(minAng, FixRound(fa), maxAng);
       fa := fa + slope;
     end;
   InitCursor;
   CalcLinear := true;
{$ifc Option(MC68881) = false }
   SetException(e, false);
   SetEnvironment(e);
{$endc }
 end;    { CalcLinear }

{ Modal dialog filter for the CalibOne calibration dialog box. }
 function CalibOneFilter (dlg: DialogPtr; var evt: EventRecord; var itemHit: integer): boolean;
   var
     pt: Point;
```

```
    oldPort: grafPtr;
  begin
    GetPort(oldPort);
    AcquireRefresh;
    CalibOneFilter := false;
    SetPort(oldPort);
  end;

{ Here's the workhorse that actually does a OneExp massage. }
  procedure doOneExp; {  (var dm : DMRec) }
    var
      idx: integer;
      p: ExpPvtPtr;
  begin
    p := ExpPvtPtr(dm.private);
    case DMTypes[dm.typeIdx].kind of
      ExpCalib, LinCalib:
        for idx := 0 to dm.inputs - 1 do
          with dm.PointsOut[idx], dm.SlotsIn[idx] do
            begin
              LastValue.i := p^.tables[idx, MinMaxOf(0, ptrfrm^.i, smallTabBound)];
              if ptrto <> nil then                          { if we have an output }
                SetSixth(ptrto, ord(SixAxis), LastValue.i);   { then set it. }
            end;
      bigExpCalib, bigLinCalib:
        for idx := 0 to dm.inputs - 1 do
          with dm.PointsOut[idx], dm.SlotsIn[idx] do
            begin
              LastValue.i := p^.bigtables[idx, MinMaxOf(0, ptrfrm^.i, bigTabBound)];
              if ptrto <> nil then                          { if we have an output }
                SetSixth(ptrto, ord(SixAxis), LastValue.i);   { then set it. }
            end;
    end;
  end;

{ HandleOneExp has all the routines nessessary to pass data from the rawData array }
{ to a point in the tree after doing an exponential tree lookup like DataGlove. }
  procedure HandleOneExp;   {•(v  :  DMVerb;•}
                            {•      var dm : DMRec);•}

    var
      i: integer;
      h: handle;
      p: ExpPvtPtr;
      size: longInt;
      tablesPtr: tablesPtrType;

    procedure WriteOneCode;
      { Write the code for a calibration DM.  }
      var
        idx, tablesize, tablebound: integer;
        p: ExpPvtPtr;
    begin
```

```
p := ExpPvtPtr(dm.private);
case DMTypes[dm.typeldx].kind of
  ExpCalib, LinCalib:
    begin
      tablesize := sizeof(AngTabType);
      tablebound := smallTabBound;
    end;
  bigExpCalib, bigLinCalib:
    begin
      tablesize := sizeof(BigAngTabType);
      tablebound := bigTabBound;
    end;
end;
for idx := 0 to dm.inputs - 1 do
  with dm.PointsOut[idx], dm.SlotsIn[idx] do
    begin
      Add_Word(SUBQ_2_SP);                          { subq.l     #2, sp }
      Add_2Word(PUSH_IMW_Op, 0);                  { move.w    #0, -(sp) }
      Add_Word($3f39);                              { move.w    <addr>, -(sp) }
      Add_Addr(Pointer(ptrfrm));
      Add_2Word(PUSH_IMW_Op, tablebound);         { move.w    #smallTabBound, -(sp) }
      Add_Word(JSR_ABS_Op);                         { jsr to MinMaxOf }
      Add_Addr(@MinMaxOf);
      Add_Word($41f9);                              { lea        @table[idx], a0 }
      Add_Long(ord4(@p^.tables) + idx * tablesize);
      Add_Word(PULLW_D0);                         { move.w    (sp)+, d0         }
      Add_Word($E348);                              { lsl.w      #1,d0        ; turn byte into
    word idx }
      Add_Word($D0C0);                              { adda.w     d0,a0  }
      Add_Word($3010);                              { move.w    (a0),d0       ; and get the
    entry. }
      Add_D0toLastValue(dm.PointsOut[idx]);
    end;
end;

function SetTableBound: integer;
begin
  case DMTypes[dm.typeldx].kind of
    ExpCalib, LinCalib:
      SetTableBound := smallTabBound;
    bigExpCalib, bigLinCalib:
      SetTableBound := bigTabBound;
  end;
end;

function OutofRange (r: integer): boolean;
{ Return true if this raw value is out of range as an index for this type of }
{ exponential calibration table. }
  var
    kind: DMType;
begin
  kind := DMTypes[dm.typeldx].kind;
  OutofRange := (r < 0) or (r > SetTableBound);
```

```
end;

procedure SayOutofRange (i, badval: integer);
  var
    str: string;
begin
  sysbeep(3);
  str := StringOf('"', dm.name, '"s input #', i + 1 : 1, ' was ', badval : 1, ' and it should be between 0
    and ');
  str := StringOf(str, SetTableBound : 1, '.');
  Announce(str);
  Announce('Scale/Offset the input to be in the proper range.');
end;

procedure Calibrate (var dm: DMRec);
{ calibrate this exponential calibration dm. }
  const
    CalibOneID = 2005;
    firstEdItem = 1;
    secondEdItem = 2;
    minEdItem = 3;
    maxEdItem = 4;
    firstBtnItem = 3;
    secondBtnItem = 1;
  var
    p: ExpPvtPtr;
    btempTab: BigAngTabType;
    dlogPtr: DialogPtr;
    firstRaw, secondRaw: array[0..5] of integer;
    str: str255;
    l: longInt;
    doit, ok: boolean;
    i, j, item, tableBound: integer;

begin    { Calibrate }
  tableBound := SetTableBound;
  p := ExpPvtPtr(dm.private);
  str := StringOf(DMTypes[dm.typeIdx].name, ', '", dm.name, '" . ');
  ParamText(str, '', '', '');
  dlogPtr := GetNewDialog(CalibOneID, nil, Pointer(-1));
  PositionWindow(dlogPtr, 98, 98);
  SetEdText(dlogPtr, firstEdItem, ntos(p^.firstAng));
  SetEdText(dlogPtr, secondEdItem, ntos(p^.secondAng));
  SetEdText(dlogPtr, minEdItem, ntos(p^.minAng));
  SetEdText(dlogPtr, maxEdItem, ntos(p^.maxAng));
  for i := 0 to dm.inputs - 1 do
    begin
      firstRaw[i] := -1;
      secondRaw[i] := -1;
    end;
  ShowWindow(dlogPtr);
  repeat
    ModalDialog(@CalibOneFilter, item);
```

```
case item of
  secondBtnItem:    { 2nd & OK clicked, already got the first point? }
    begin
      doit := true;
      for i := 0 to dm.inputs - 1 do   { check for 1st & 2nd legal. }
        if OutofRange(firstRaw[i]) then
          begin  { they haven't got the first ang yet, can't get second. }
            sysbeep(3);
            Announce('Get the first value first.');
            doit := false;
          end
        else
          begin
            secondRaw[i] := dm.SlotsIn[i].ptrfrm^.i;
            if OutofRange(secondRaw[i]) then
              begin  { YowZa! this is only set up for raw bytes! }
                doit := false;
                SayOutofRange(i, secondRaw[i]);
                secondRaw[i] := -1;
              end
            else if OutofRange(firstRaw[i]) then
              doit := false;
          end;   { for i, check for legal values. }
      if not doit then
        item := 1000
      else
        with p^ do
          begin
            GetEdText(dlogPtr, firstEdItem, str);
            StringtoNum(str, l);
            firstAng := l;
            GetEdText(dlogPtr, secondEdItem, str);
            StringtoNum(str, l);
            secondAng := l;
            GetEdText(dlogPtr, minEdItem, str);
            StringtoNum(str, l);
            minAng := l;
            GetEdText(dlogPtr, maxEdItem, str);
            StringtoNum(str, l);
            maxAng := l;
            for i := 0 to dm.inputs - 1 do
              begin
                case DMTypes[dm.typeIdx].kind of
                  ExpCalib, bigExpCalib:
                    ok := CalcCurve(firstRaw[i], firstAng, secondRaw[i], secondAng, minAng, maxAng,
btempTab, tablebound);
                  LinCalib, bigLinCalib:
                    ok := CalcLinear(firstRaw[i], firstAng, secondRaw[i], secondAng, minAng,
maxAng, btempTab, tablebound);
                end;  { case }
                if ok then
                  if tableBound = smallTabBound then
                    begin
```

```
                    for j := 0 to smallTabBound do
                      p^.tables[i, j] := btempTab[j];
                    end
                  else
                    p^.bigtables[i] := btempTab;
                end;
              end;
          end;
        firstBtnItem: { 1st Point clicked }
          for i := 0 to dm.inputs - 1 do
            begin
              firstRaw[i] := dm.SlotsIn[i].ptrfrm^.i;
              if OutofRange(firstRaw[i]) then
                begin
                  SayOutofRange(i, firstRaw[i]);
                  firstRaw[i] := -1;
                end;
            end;
        otherwise
          ;
      end;     { case }
    until item <= 2;
    if item = 1 then
      begin
        FileDirty[dmFile] := true;
      end
    else
      begin
      end;
    DisposDialog(dlogPtr);
  end;

  procedure BlindCalibrate (var dm: DMRec; action: integer);
{ This is called only by scripts and they should know what they are doing. }
{ If action = 1 then for every input, the current value is written to the first 6 }
{ integers of the first table. If action = 2 then write the second set of input to the }
{ next 6 integers. If action = 3 then then those ints are used as the first }
{ and second points and the dm is calibrated. }
    var
      i, j: integer;
      ok: boolean;
      tableBound: integer;
      p: ExpPvtPtr;
      btempTab: BigAngTabType;
      firstRaw, secondRaw: array[0..5] of integer;
  begin
    tableBound := SetTableBound;
    p := ExpPvtPtr(dm.private);
    case action of
      1, 2:
        begin  { First or second time, stick the first values into the array 0..5 }
          j := 6 * (action - 1);    { if 1 j=0, if 2 j=6 }
          for i := 0 to dm.inputs - 1 do
```

```
        begin
          p^.tables[0, i + j] := dm.SlotsIn[i].ptrfrm^.i;
          if OutofRange(p^.tables[0, i + j]) then
            begin
              SayOutofRange(i, p^.tables[0, i + j]);
              p^.tables[0, i + j] := -1;
            end;
        end;
    end;
  3:
    begin  { Third time, do the calibration }
      for i := 0 to dm.inputs - 1 do { recover values that were stuffed into }
        begin                          { table 0. }
          firstRaw[i] := p^.tables[0, i];
          secondRaw[i] := p^.tables[0, i + 6];
        end;
      for i := 0 to dm.inputs - 1 do
        with p^ do
          begin
            case DMTypes[dm.typeIdx].kind of
              ExpCalib, bigExpCalib:
                ok := CalcCurve(firstRaw[i], firstAng, secondRaw[i], secondAng, minAng, maxAng,
btempTab, tablebound);
              LinCalib, bigLinCalib:
                ok := CalcLinear(firstRaw[i], firstAng, secondRaw[i], secondAng, minAng, maxAng,
btempTab, tablebound);
            end;{ case }
            if ok then
              if tableBound = smallTabBound then
                begin
                  for j := 0 to smallTabBound do
                    p^.tables[i, j] := btempTab[j];
                end
              else
                p^.bigtables[i] := btempTab;
          end;
    end;
  end;   { case }
end;     { BlindCalibrate }


procedure AddMenu;
  var    { add a menu item for this calibration module. }
    str: string;
begin
  if false then
    begin
      str := stringOf(DMTypes[dm.typeIdx].name, ' "', dm.name, '".');
      AddDMMenu(dm, str);
    end;
end;

begin
```

```
case v of
 initDM:          { Called once the first time this DM is started. }
   begin
     if dm.private <> nil then
       doClose(dm);
   { calculate the size of private storage.  First it is the size of the private }
   { storage type - the array of tables at the end. }
     size := sizeof(ExpPvtType) - sizeof(bigTablesType);
   { Then, since every input/output pair gets it's own table, multiply the }
   { number of inputs times the size of one table.  The table might be big or small. }
     case DMTypes[dm.typeIdx].kind of
       ExpCalib, LinCalib:
         size := size + sizeOf(AngTabType) * dm.inputs;
       bigExpCalib, bigLinCalib:
         size := size + sizeOf(BigAngTabType) * dm.inputs;
     end;    { case }
     h := NewHandle(size);
     if h <> nil then
       begin
         MoveHHi(h);
         HLock(h);
         dm.private := h^;
         p := ExpPvtPtr(dm.private);
         p^.firstAng := 0;
         p^.secondAng := 900;
         p^.minAng := 0;
         p^.maxAng := 1150;
         case DMTypes[dm.typeIdx].kind of
           ExpCalib, LinCalib:
             begin  { initialize all the small tables to the identity matrix. }
               for i := 0 to smallTabBound do
                 p^.tables[0, i] := i;
               for i := 1 to dm.inputs - 1 do
                 p^.tables[i] := p^.tables[0];
             end;
           bigExpCalib, bigLinCalib:
             begin  { initialize all the big tables to the identity matrix. }
               for i := 0 to bigTabBound do
                 p^.bigtables[0, i] := i;
               for i := 1 to dm.inputs - 1 do
                 p^.bigtables[i] := p^.bigtables[0];
             end;
         end;
         Calibrate(dm);
         AddMenu;
       end
     else
       begin
         Announce('Not enough memory to open this Exp Calib DM');
         dm.state := usrOff;
       end;
   end;
 massageDM:       { Called once through the main loop.  do a massage }
```

```
    doOneExp(dm);
   closeDM:            { Called when this module is deleted.  Do whatever... }
    doClose(dm);
   reHookedDM:
    begin
    end;
   fopenDM:            { This DM has just been read from a file.  If it's state is }
                       { on it was hooked up properly.  private points to the }
    begin              { private memory it had when saved. }
      AddMenu;
      globK := 39;
    end;
   fsaveDM:            { This DM is about to be saved to a file.  Do any changes }
    begin              { nessessary to private memory so it can be restored later. }
    end;
   calibDM:            { Calibrate the DM module. }
    begin
      Calibrate(dm);
    end;
   menuHitDM:
    Calibrate(dm);
   describeDM:
    begin
      p := ExpPvtPtr(dm.private);
      with p^ do
        begin
          describeStr := StringOf('First angle: ', firstAng : 1, ', Second angle: ', secondAng : 1);
          describeStr := StringOf(describeStr, '.  Min: ', minAng : 1, ' Max: ', maxAng : 1);
        end;
    end;
   CalibPartDM:
    BlindCalibrate(dm, DMverbMod);
   writeCodeDM:
    WriteOneCode;
   otherwise           { Should be no other. }
    sysbeep(3);
  end;        { case }
 end;         { HandleCalib }

{------------------------------------------}
 procedure doWrtFlash; { (var dm : DMRec) }
  var
   err: integer;
 begin
  if flashDAR.state = DAon then
   with dm, dm.PointsOut[0] do
    begin
     LastValue.i := SlotsIn[0].ptrfrm^.i;
     err := Write_io_port(privateWords[1], LastValue.i);
     if ptrto <> nil then
      SetSixth(ptrto, ord(SixAxis), LastValue.i);
    end;
 end;
```

```
{ HandleWrtFlash has all the routines nessessary to pass data to a port on the DataFlash. }
 procedure HandleWrtFlash; {•(v : DMVerb;•}
                           {•    var dm : DMRec);•}

  var
   i: integer;
   h: handle;

  procedure Calibrate (var dm: DMRec);
   var { calibrate this WrtFlash dm. }
    prompt1, str1, str2: str255;
  begin
   prompt1 := concat('WrtFlash DM module "', dm.name, '".');
   prompt1 := concat(prompt1, chr(13), 'Enter the port to write to (hex):');
   str1 := HexWord(dm.privateWords[1]);
   if GetStrings(prompt1, '', str1, str2) then
    begin
     if str1 <> '' then
      begin
       StuffHex(ptr(ord4(@dm.privateWords[1]) + 1), str1);
       dm.privateWords[1] := MinMaxOf(0, dm.privateWords[1], 255);
       FileDirty[dmFile] := true;
      end;
    end;
  end;

 begin
  case v of
   initDM:        { Called once the first time this DM is started. }
    begin
     dm.privateWords[1] := 0;
     Calibrate(dm);
    end;
   massageDM:     { Called once through the main loop. do a massage }
    doWrtFlash(dm);
   closeDM:       { Called when this module is deleted. Do whatever... }
    doClose(dm);
   reHookedDM:
    ;             { DM has been re-hooked up. who cares? }
   fopenDM:       { This DM has just been read from a file. If it's state is }
                  { on it was hooked up properly. private points to the }
    begin         { private memory it had when saved. }
    end;
   fsaveDM:       { This DM is about to be saved to a file. Do any changes }
    begin         { nessessary to private memory so it can be restored later. }
    end;
   calibDM:       { Calibrate the DM module. }
    begin
     Calibrate(dm);
    end;
   describeDM:    { put a description into describeStr }
    begin
     describeStr := StringOf('WriteFlash: write to port ', dm.privateWords[1] : 1, '.');
```

```
      end;
    writeCodeDM:
      ;
    otherwise       { Should be no other. }
      sysbeep(3);
  end;      { case }
 end;       { HandleWrtFlash }


{-----------------------------------------}
 procedure doConst; { (var dm : DMRec) }
 begin
  with dm, dm.PointsOut[0] do
   if ptrto <> nil then
    SetSixth(ptrto, ord(SixAxis), LastValue.i);
 end;
{ HandleConst presents a constant as output #1. }
 procedure HandleConst; {•(v : DMVerb;•}
                        {•   var dm : DMRec);•}

  var
   i: integer;
   h: handle;

  procedure SetLast (var dm: DMRec);
   var
    p: DPtr;
    oldOutType: DType;
    r: Real;
  begin
   p := DPtr(@dm.privateWords);
   oldOutType := DType(dm.privateWords[2]);
   if oldOutType <> dm.PointsOut[0].outType then
    begin
     case oldOutType of
      intD:
       r := p^.i;
      longD:
       r := p^.l;
      fixedD:
       r := Fix2X(p^.f);
      realD:
       r := p^.r;
     end;
     case dm.PointsOut[0].outType of
      intD:
       p^.i := round(r);
      longD:
       p^.l := round(r);
      fixedD:
       p^.f := X2Fix(r);
      realD:
       p^.r := r;
```

```
      end;
      dm.privateWords[2] := ord(dm.PointsOut[0].outType);
    end;
  with dm.PointsOut[0] do
    LastValue := p^;
  DMCodeInvalid := true;
end;

procedure Calibrate (var dm: DMRec);
  var { calibrate this Const/Offset dm. }
    prompt1, str1: str255;
    p: DPtr;
    l: longInt;
    r: Real;
begin
  with dm do
    begin
      p := DPtr(@dm.privateWords);
      prompt1 := concat('Const DM module "', dm.name, '".');
      prompt1 := StringOf(prompt1, chr(13), 'Enter the new ', dm.PointsOut[0].outType, ' Const
     value:');
      case dm.PointsOut[0].outType of
        intD:
          str1 := ntos(p^.i);
        longD:
          str1 := ntos(p^.l);
        fixedD:
          str1 := StringOf(Fix2X(p^.f) : 3 : 3);
        realD:
          str1 := StringOf(p^.r : 3 : 3);
      end;
      if GetStrings(prompt1, '', str1, str1) then
        begin
          case dm.PointsOut[0].outType of
            intD:
              begin
                StringtoNum(str1, l);
                p^.i := l;
              end;
            longD:
              StringtoNum(str1, p^.l);
            fixedD:
              begin
                r := StringtoReal(str1);
                p^.f := X2Fix(r);
              end;
            realD:
              p^.r := StringtoReal(str1);
          end;
          FileDirty[dmFile] := true;
          dm.privateWords[2] := ord(dm.PointsOut[0].outType);
          SetLast(dm);
        end;
```

```
      end;
   end;

 begin
   case v of
     initDM:              { Called once the first time this DM is started. }
       begin
         if dm.private <> nil then
           doClose(dm);
         dm.privateWords[0] := 0;
         dm.privateWords[1] := 0;
         dm.privateWords[2] := ord(dm.PointsOut[0].outType);
         Calibrate(dm);
       end;
     massageDM:           { Called once through the main loop.  do a massage }
       doConst(dm);
     closeDM:             { Called when this module is deleted.  Do whatever... }
       doClose(dm);
     reHookedDM:          { DM has been re-hooked up. }
       SetLast(dm);
     fopenDM:             { This DM has just been read from a file.  If it's state is }
                              { on it was hooked up properly.  private points to the }
       begin              { private memory it had when saved. }
         SetLast(dm);
       end;
     fsaveDM:             { This DM is about to be saved to a file.  Do any changes }
       begin              { nessessary to private memory so it can be restored later. }
       end;
     calibDM:             { Calibrate the DM module. }
       begin
         Calibrate(dm);
       end;
     CalibPartDM:
       begin
         dm.privateWords[0] := DMverbMod;
         SetLast(dm);
       end;
     describeDM:          { put a description into describeStr }
       begin
         describeStr := StringOf('Const: ', dm.privateWords[0] : 1, '.');
       end;
     writeCodeDM:
       if dm.PointsOut[0].outType = intD then
         begin
           Add_MoveImDn(dm.PrivateWords[0], 0);
           Add_D0toLastValue(dm.PointsOut[0]);             { save result }
         end;
     otherwise            { Should be no other. }
       sysbeep(3);
   end;      { case }
 end;        { HandleConst }
```

```
end.
```

```
unit TimeDMs;

interface

  uses
    ChuckStuff, AutoLib, FastStuff, Globals, Tree3DGlob, MiscRoutines, {}
    formTree3D, Tree3D, DMTypes, DMGlobals;

  procedure doDelay (var dm: DMRec);
  procedure HandleDelay (v: DMVerb; var dm: DMRec);

  procedure doDeBounce (var dm: DMRec);
  procedure HandleDeBounce (v: DMVerb; var dm: DMRec);

  procedure doStretch (var dm: DMRec);
  procedure HandleStretch (v: DMVerb; var dm: DMRec);

  procedure doClock (var dm: DMRec);
  procedure HandleClock (v: DMVerb; var dm: DMRec);

implementation

  const
    MaxDelay = 30;

  type    { Private storage for a Delay/Offset DM. }
    DelayPvtType = record
        delayby: integer;
        head, tail: integer;
        buff: array[0..MaxDelay] of integer;
      end;
    DelayPvtPtr = ^DelayPvtType;

    ClockType = record
        interval, nextTick: LongInt;
        doSec: Boolean;
        newValue: integer;          { for debounce }
      end;
    ClockTypePtr = ^ClockType;

    BounceRec = record
        bounceTicks: integer;
        gotitTick: LongInt;
      end;
    BouncePtr = ^BounceRec;

{------------------------------------------}
{ Delay DM. }
{ 2 inputs, 1 output. }
{ If in2 has changed since the last time then put in1 into the head of a queue and output the }
{ tail of the queue.  If in2 hasn't changed then out1 stays the same. }
{ The length of the queue can be from 2 to 30 and is set in the dm's calibration. }
```

```
procedure doDelay; { (var dm : DMRec) }
  var
    i: integer;
    r: real;
    sptr: DelayPvtPtr;
begin
  sptr := DelayPvtPtr(dm.private);
  with dm, dm.PointsOut[0], sptr^ do
    if SlotsIn[1].ptrfrm^.i <> PrivateWords[0] then
      begin
        PrivateWords[0] := SlotsIn[1].ptrfrm^.i;
        buff[head] := SlotsIn[0].ptrfrm^.i;   { save the newest input value. }
        head := head + 1;
        if head >= delayby then               { inc head }
          head := 0;
        LastValue.i := buff[head];        { get the new delayed value. }
        if ptrto <> nil then
          SetSixth(ptrto, ord(SixAxis), LastValue.i);
      end;
end;
{ HandleDelay sets up a Delay DM. }
procedure HandleDelay; {•(v  : DMVerb;•}
                       {•     var dm : DMRec);•}

  var
    i: integer;
    h: handle;
    sptr: DelayPvtPtr;

  procedure Calibrate (var dm: DMRec);
    var { calibrate this Delay dm. }
      sptr: DelayPvtPtr;
      prompt1, str1, str2: str255;
      r: extended;
  begin
    sptr := DelayPvtPtr(dm.private);
    prompt1 := concat('Delay DM module "', dm.name, '".');
    prompt1 := StringOf(prompt1, chr(13), 'Delay count (max ', MaxDelay : 1, '):');
    if sptr = nil then
      Announce('Error, private pointer is nil.')
    else
      begin
        str1 := ntos(sptr^.Delayby);
        if GetStrings(prompt1, '', str1, str2) then
          begin
            if str1 <> '' then
              begin
                sptr^.delayby := StringtoInt(str1);
                sptr^.delayby := MinOf(sptr^.delayby, MaxDelay);
                sptr^.head := 0;
                FileDirty[dmFile] := true;
              end;
          end;
```

```
    end;
  end;

begin
  case v of
    initDM:             { Called once the first time this DM is started. }
      begin
        if dm.private <> nil then
          doClose(dm);
        h := NewHandle(sizeof(DelayPvtType));
        if h <> nil then
          begin
            MoveHHi(h);
            HLock(h);
            dm.private := h^;
            sptr := DelayPvtPtr(dm.private);
            sptr^.Delayby := 5;
            sptr^.head := 0;
            Calibrate(dm);
          end
        else
          begin
            Announce('Not enough memory to open this Delay/Offset DM');
            dm.state := usrOff;
          end;
      end;
    massageDM:          { Called once through the main loop. do a massage }
      doDelay(dm);
    closeDM:            { Called when this module is deleted. Do whatever... }
      doClose(dm);
    reHookedDM:
      ;                 { DM has been re-hooked up. who cares? }
    fopenDM:            { This DM has just been read from a file. If it's state is }
                        { on it was hooked up properly. private points to the }
      begin             { private memory it had when saved. }
      end;
    fsaveDM:            { This DM is about to be saved to a file. Do any changes }
      begin             { nessessary to private memory so it can be restored later. }
      end;
    calibDM:            { Calibrate the DM module. }
      begin
        Calibrate(dm);
      end;
    describeDM:         { put a description into describeStr }
      begin
        sptr := DelayPvtPtr(dm.private);
        describeStr := StringOf('Delay = ', sptr^.Delayby : 1);
      end;
    writeCodeDM:
      ;
    otherwise
      GenericHandle(v, dm);
  end;      { case }
```

```
 end;      { HandleDelay }

{-----------------------------------------}
 procedure CalibrateClock (var dm: DMRec; usrStr: string);
  const
   ClockDlogID = 2044;
   JiffItem = 5;
   SecItem = 6;
  var  { calibrate this Clock DM. }
   dlog: DialogPtr;
   str: Str255;
   i, itemHit: integer;
   temp: Boolean;
   p: ClockTypePtr;
 begin
  p := ClockTypePtr(@dm.PrivateWords);
  ParamText(usrStr, '', '', '');
  with p^ do
   begin
    dlog := GetNewDialog(ClockDlogID, nil, Pointer(-1));
    PositionWindow(dlog, 50, 30);
    showWindow(dlog);
    temp := doSec;
    RadioRange(dlog, JiffItem, 2, ord(temp));

    if doSec then
     str := ntos(interval div 60)
    else
     str := ntos(interval);
    SetEdText(dlog, 1, str);
    repeat
     ModalDialog(nil, itemHit);
     case itemHit of
      JiffItem, SecItem:
       begin
        temp := (itemHit = SecItem);
        RadioRange(dlog, JiffItem, 2, ord(temp));
       end;
     end;
    until itemHit <= 2;  { Until OK or Cancel is clicked. }
    if itemHit = 1 then
     begin { OK clicked. }
      doSec := temp;
      GetEdText(dlog, 1, str);
      StringToNum(str, interval);
      if doSec then
       interval := interval * 60;
     end;
    DisposDialog(dlog);
   end;
 end;

{-----------------------------------------}
```

```
{ One input, one output.  The output of debounce doesn't change until the input has }
{ stayed the same for the required length of time. }
  procedure doDeBounce; { (var dm : DMRec) }
    var
      i: integer;
      bptr: ClockTypePtr;
  begin
    with dm, dm.PointsOut[0] do
      begin
        bptr := ClockTypePtr(@privateWords);
        i := SlotsIn[0].ptrfrm^.i;
        if i <> LastValue.i then
          begin                    { if input is different than output then }
            if (i <> bptr^.newValue) then
              begin          { if input is different than input clocking on then }
                bptr^.newValue := i;                    {   reset the clock }
                bptr^.nextTick := Ticks^ + bptr^.interval;
              end
            else if bptr^.nextTick <= Ticks^ then       { else if enough time has passed then }
              LastValue.i := bptr^.newValue             {   change the output. }
          end
        else
          bptr^.newValue := i;
        if ptrto <> nil then
          SetSixth(ptrto, ord(SixAxis), LastValue.i);
      end;
  end;

{ HandleDeBounce has all the routines nessessary to debounce an input. }
  procedure HandleDeBounce (v: DMVerb; var dm: DMRec);

    var
      i: integer;
      bptr: ClockTypePtr;

    procedure SetTick (var dm: DMRec);
      var
        i: integer;
        bptr: ClockTypePtr;
    begin
      bptr := ClockTypePtr(@dm.privateWords);
      bptr^.nextTick := Ticks^;
      bptr^.newValue := -3333;
    end;

  begin
    case v of
      initDM:            { Called once the first time this DM is started. }
        begin
          if dm.private <> nil then
            doClose(dm);
          dm.version := 1;
          bptr := ClockTypePtr(@dm.privateWords);
```

```
          bptr^.interval := 1;
          bptr^.doSec := false;
          CalibrateClock(dm, concat('Debounce DM "', dm.name, '".'));
          SetTick(dm);
        end;
      massageDM:        { Called once through the main loop. do a massage }
        doDeBounce(dm);
      closeDM:          { Called when this module is deleted. Do whatever... }
        doClose(dm);
      reHookedDM:       { DM has been re-hooked up. }
        SetTick(dm);
      fopenDM:          { This DM has just been read from a file. If it's state is }
                           { on it was hooked up properly. private points to the }
        begin           { private memory it had when saved. }
          if dm.version <> 1 then
            begin
              bptr := ClockTypePtr(@dm.privateWords);
              bptr^.interval := dm.privateWords[0];
              bptr^.doSec := (bptr^.interval mod 60) = 0;
              dm.version := 1;
            end;
          SetTick(dm);
        end;
      calibDM:          { Calibrate the DM module. }
        begin
          CalibrateClock(dm, concat('Debounce DM "', dm.name, '".'));
          SetTick(dm);
        end;
      describeDM:       { put a description into describeStr }
        begin
          bptr := ClockTypePtr(@dm.privateWords);
          describeStr := StringOf('DeBounce: ', bptr^.interval : 1, ' jiffys.');
        end;
      otherwise
        GenericHandle(v, dm);
    end;      { case }
  end;        { HandleDeBounce }

{-------------------------------------------}
{ StretchPulse }
{ One input, one output. Every change in input is stretched to the calibration time unless there}
{ is an input currently being stretched. }
  procedure doStretch (var dm: DMRec);
    var
      i: integer;
      p: ClockTypePtr;
  begin
    with dm.PointsOut[0] do
      begin
        p := ClockTypePtr(@dm.privateWords);
        i := dm.SlotsIn[0].ptrfrm^.i;
        if i <> LastValue.i then
          begin                    { if input is different than output then }
```

-000721

```
        if Ticks^ >= p^.nextTick then
          begin       {  if stretch time has passed then }
            LastValue.i := i;                       {       set new stretch time counting. }
            p^.nextTick := Ticks^ + p^.interval;
          end;
        end;
      if ptrto <> nil then
        SetSixth(ptrto, ord(SixAxis), LastValue.i);
    end;
  end;

{ HandleStretch has all the routines nessessary to Stretch an input. }
  procedure HandleStretch (v: DMVerb; var dm: DMRec);

    var
      i: integer;
      p: ClockTypePtr;

    procedure SetTick (var dm: DMRec);
      var
        i: integer;
        p: ClockTypePtr;
    begin
      p := ClockTypePtr(@dm.privateWords);
      p^.nextTick := Ticks^;
    end;

  begin
    case v of
      initDM:           { Called once the first time this DM is started. }
        begin
          if dm.private <> nil then
            doClose(dm);
          p := ClockTypePtr(@dm.privateWords);
          p^.interval := 1;
          p^.doSec := false;
          CalibrateClock(dm, concat('Stretch DM "', dm.name, '".'));
          SetTick(dm);
        end;
      massageDM:        { Called once through the main loop.  do a massage }
        doStretch(dm);
      closeDM:          { Called when this module is deleted.  Do whatever... }
        doClose(dm);
      reHookedDM:       { DM has been re-hooked up. }
        SetTick(dm);
      fopenDM:          { This DM has just been read from a file.  If it's state is }
                            { on it was hooked up properly.  private points to the }
        begin           { private memory it had when saved. }
          SetTick(dm);
        end;
      calibDM:          { Calibrate the DM module. }
        begin
          CalibrateClock(dm, concat('Stretch DM "', dm.name, '".'));
```

```
        SetTick(dm);
      end;
    describeDM:       { put a description into describeStr }
      begin
        p := ClockTypePtr(@dm.privateWords);
        describeStr := StringOf('Stretch: ', p^.interval : 1, ' jiffys.');
      end;
    otherwise
      GenericHandle(v, dm);
  end;      { case }
end;        { HandleStretch }

{-----------------------------------------}
{ ClockDM }
{ No inputs, 2 outputs. }
{ When user specified interval has passed, pulse output #1 and increment output #2. }

  procedure doClock (var dm: DMRec);
    { do one massage on this dm. The inputs are valid and the outputs may or may not be nil. }
    var
      p: ClockTypePtr;
      changed: Boolean;
  begin
    p := ClockTypePtr(@dm.PrivateWords);
    changed := false;
    with p^, dm.PointsOut[1] do
      begin
        if TickCount >= nextTick then
          begin
            if dm.inputs <> 0 then
              begin                { If the dm has any inputs then use input 0 as the interval. }
                interval := dm.SlotsIn[0].ptrfrm^.i;
                if doSec then
                  interval := interval * 60;
              end;
            nextTick := TickCount + interval;
            changed := true;
            LastValue.i := LastValue.i + 1;
            if LastValue.i < 0 then
              LastValue.i := 1;
            if ptrto <> nil then
              SetSixth(ptrto, ord(SixAxis), LastValue.i);
          end;
      end;
    with dm.PointsOut[0] do
      if ord(changed) <> LastValue.i then
        begin
          LastValue.i := ord(changed);
          if ptrto <> nil then
            SetSixth(ptrto, ord(SixAxis), LastValue.i);
        end;
  end;
```

-000723

```
procedure HandleClock (v: DMVerb; var dm: DMRec);
  { Handle all the other verbs for this dm. }
  var
    p: ClockTypePtr;

  procedure ResetClock (var dm: DMRec);
    var
      p: ClockTypePtr;
  begin
    p := ClockTypePtr(@dm.PrivateWords);
    p^.nextTick := TickCount;
    dm.PointsOut[0].LastValue.i := ord(false);
    dm.PointsOut[1].LastValue.i := 0;
  end;

begin
  case v of
    initDM:          { Called once the first time this DM is started. }
      begin
        doClose(dm);
        p := ClockTypePtr(@dm.PrivateWords);
        p^.interval := 60;
        p^.doSec := true;
        CalibrateClock(dm, concat('Clock DM "', dm.name, '".'));
        ResetClock(dm);
      end;
    calibDM:
      begin
        CalibrateClock(dm, concat('Clock DM "', dm.name, '".'));
        ResetClock(dm);
      end;
    CalibPartDM, fopenDM:
      ResetClock(dm);

    otherwise
      GenericHandle(v, dm);
  end;      { case }
end;        { HandleClock }

end.
```

```
{ DataSuit Tree Rendering, Editing and Transversing procedures. }

{  By Chuck Blanchard,  7/13/87}
{  Copyright 1985 VPL Research, Inc.  All rights reserved}

{Tree procedures }

unit Tree3D;

interface

 uses
   FixMath, AutoLib, ChuckStuff, scottsStuff, FastStuff, Globals, Tree3DGlob,{}
   miscRoutines, TreeRender, formTree3D, SinCosTree, TreeEdit;

 const
      { Items for the Tree menu }
   AddPtDItem = 1;                    { Add Point Down }
   AddObjDItem = 2;                   { Add Object Down }
   AddPtRItem = 3;                    { Add Point Right }
                                      {   ------- }
   EdPtItem = 5;                      { Edit Point - DataSuit rehooks I/O here and up. }
   FlickaItem = 6;                    { Flicker }
   RefreshItem = 7;                   { Refresh }
   PerspecItem = 8;                   { Perspective }

   TreeFileType = 'DSTR';         { Tree file type for mac file system. }
 type
   fileTreeRec = record
      version: integer;
      treeRoot: PRecPtr;
      NxtStor: integer;
    end;


 procedure TreeUpdate (trp: TreeRecPtr); { update for tree window. }
 procedure TreeWResize (trp: TreeRecPtr);   { Tree window has resized. }

 function FindTreeName (trp: TreeRecPtr; n: nameStr): PRecPtr;
 function SearchTree (trp: TreeRecPtr; str: Str255; findCount: integer; exact: Boolean): Boolean;
 procedure TreeKey (trp: TreeRecPtr; key: char);

 procedure NewTree (trp: TreeRecPtr);
 procedure InitTree (trp: TreeRecPtr; showWindow: boolean);
 procedure DisposeTree (trp: TreeRecPtr);
 procedure Init3D;
 procedure Close3D;

 procedure MoveNode (move, newpar: PRecPtr);

 procedure TreeEdit (trp: TreeRecPtr; Item_No: integer);

 procedure TogFlicka;   { toggle doing off screen buffering for no flicker on/off. }
```

```
 procedure TreeWindow (trp: TreeRecPtr; on: boolean);
 procedure TreeMouse (trp: TreeRecPtr; ev: EventRecord);
 procedure doTreeMenu (trp: TreeRecPtr; Item_No: integer);

 function GetTree (trp: TreeRecPtr; vref: integer; fname: string): integer;
 function PutTree (trp: TreeRecPtr; vref: integer; fname: string): integer;

 procedure TreePrint (var out: Text; trp: TreeRecPtr; name: string; forActa: Boolean);
 function popUpPointNames (topLeft: point; var n: NameStr; var six: signedByte): Boolean;
 function popUpPointAxis (topLeft: point; var lastOne: signedByte): Boolean;

implementation

 const
  TreeResType = 'Tree';        { Tree resource type. }
  PRResType = 'PRec';          { PointRec resource type. }
  TreeVersion = 2;
  ThreeDRecttop = 28;          { top bound of ThreeDRect }
  treeWindID = 128;            { resource ID for the tree window. }
  TreeConfigRes = 'TRcf';      { Tree configuration resource type. }


 procedure TreeUpdate; { (trp : TreeRecPtr) }
 begin  { Call the real tree update which is in treeRender.pas }
  rTreeUpdate(trp);
 end;

 function FindTreeName; { (trp : TreeRecPtr; n : nameStr) : PRecPtr }
{ Find the named tree node. If it doesn't exist return nil. This just calls }
{ fFindTreeName so other routines don't have to include the formTree unit. }
 begin
  FindTreeName := fFindTreeName(trp, n);
 end;

 procedure NewTree; { (trp : TreeRecPtr) }
{ Start over with a new tree in this window. A new tree just has the world point. }
 begin
  fNewTree(trp);
 end;

 procedure TreeKey;
 begin
  rTreeKey(trp, key);
 end;

 procedure InitTree; { (trp : TreeRecPtr; showWindow: boolean) }
{ Call this at the begining of the program. It initializes everything}
{   needed to render a 3d object. }
  var
   i, j: integer;
   WRect: Rect;
   WType: integer;
   p: Ptr;
```

```
    size: longInt;

  begin
    SetRect(WRect, 100, 42, 505, 330);
    if showwindow then
      begin
        WType := documentProc;
        trp^.wp := GetNewWindow(treeWindID, nil, Pointer(-1));
        if trp^.wp <> nil then
          begin
            if CheckOnScreen(trp^.wp) then
              ;
          end
        else
          trp^.wp := NewWindow(nil, WRect, 'Tree', showwindow, 8, Pointer(-1), true, 0);
        SetPort(trp^.wp);
        TextSize(9);
        TextFont(monaco);
      end
    else
      trp^.wp := nil;
    if trp^.wp <> nil then
      begin
        trp^.ThreeDRect := trp^.wp^.portRect;
        with trp^.ThreeDRect do
          begin
            top := top + ThreeDRecttop;
            bottom := bottom - 15;
            right := right - 15;
          end;
      end;
    for i := 1 to MaxStorage do
      trp^.Storage[i] := nil;
    NewTree(trp);
    if trp = maintreeptr then
      begin
        CheckItem(WindMHndl, TreeWItem, WindowOn(maintreeptr^.wp));
        TreeWResize(trp);
      end;
  end;    { InitTree }

  procedure DisposeTree (trp: TreeRecPtr);
    { Free up all the memory used by the given tree and get rid of it. }
    var
      i: integer;
  begin
    if trp^.wp <> nil then
      DisposeWindow(trp^.wp);
    for i := 1 to MaxStorage do
      if trp^.Storage[i] <> nil then
        DisposeIt(trp, trp^.Storage[i]);
    DisposPtr(Pointer(trp));
  end;
```

```
{ Show or hide the window for this tree. }
 procedure TreeWindow; {• (trp : TreeRecPtr;•}
                       {•     on : boolean);•}
 begin
  if WindowOn(trp^.wp) <> on then
    begin
     if on then
       begin
        ShowWindow(trp^.wp);
        SelectWindow(trp^.wp);
        SetPort(trp^.wp);
       end
     else
       HideWindow(trp^.wp);
    end;
  CheckItem(WindMHndl, TreeWItem, on);
 end; { TogDisplay }

 function SearchTree (trp: TreeRecPtr; str: Str255; findCount: integer; exact: Boolean): Boolean;
  var
   found: Boolean;
  procedure findName (p: PRecPtr);
   var
    str2:  Str255;
  begin
   if found then
    exit(findName);
   found := NameMatch(str, p^.name, exact);
   if found then
     begin
      findCount := findCount - 1;
      if (findCount = 0) then
        begin
         mainTreePtr^.edPtr := p;
         p^.dirty := true;
        end
       else
        found := false;
     end;
  end;
 begin
  UprString(str,  true);
  found := false;
  PreFixTreeWalk(mainTreePtr^.TreeRoot, findName);
  if found and (trp^.wp <> nil) then
    begin
     if WindowOn(trp^.wp) then
       SelectWindow(trp^.wp)
     else
       TreeWindow(trp, true);
    end;
  SearchTree := found;
```

```
    if found then
      trp^.dirty := true;
  end;

  procedure TogFlicka;
{ Toggle writing to the offscreen buffer for no flicker on and off. }
{ This also has some side effects. If the command key is down then it toggles }
{ showing the enclosing rectangle on/off. }
    var
      event: EventRecord;
      bool: boolean;
  begin
    bool := GetNextEvent(0, event);
    if (BitAnd(Event.modifiers, cmdKey) = cmdKey) then
      showRect := not showRect
    else
      begin
        if noFlick then
          noFlick := false
        else if offScreenPort.portBits.baseAddr <> nil then
          noFlick := true;
      end;
    CheckItem(TreeMHndl, FlickaItem, not noFlick);
  end;

  procedure MoveNode; { (move, newpar: PRecPtr) }
    { Move the given node from wherever it is to under the new parent. }
    { Since this doesn't move any memory the DM list doesn't need to be fixed up. }
    var
      p, p2: PRecPtr;
  begin
    if (move = nil) or (newpar = nil) then
      exit(MoveNode);
    if move^.up = newpar then
      exit(MoveNode);

    mainTreePtr^.dirty := true;
    { First take the move node out of it's current parents list. }
    p := move^.up;
    if p^.down = move then
      p^.down := move^.right
    else
      begin
        p := p^.down;
        while p^.right <> move do
          p := p^.right;
        p^.right := move^.right;
      end;
    { Now insert it at the end of the nodes under newpar }
    if newpar^.down = nil then
      newpar^.down := move
    else
      begin
```

```
      p := newpar^.down;
      while p^.right <> nil do
        p := p^.right;
      p^.right := move;
    end;
   { And make sure the moved node is pointing up to the new parent. }
   move^.up := newpar;
   move^.right := nil;
  end;

    {-----------------------------------------------}
{   Edit menu Cut, Copy, Paste, and Clear.          }
    {-----------------------------------------------}

  procedure TreeCopy (trp: TreeRecPtr);
  begin
   if trp^.edPtr <> nil then
     begin
       NewTree(clipTreePtr);
       CopySubTree(trp, clipTreePtr);
     end;
  end;    { TreeCopy }

  procedure TreeCut (trp: TreeRecPtr);
  begin
   if trp^.edPtr <> nil then
     begin
       TreeCopy(trp);
       TreeClear(trp);
       FileDirty[treeFile] := true;
     end;
  end;

  procedure TreePaste (trp: TreeRecPtr);
  begin
   if trp^.edPtr = nil then
     trp^.edPtr := trp^.TreeRoot;
   with clipTreePtr^ do
     edPtr := TreeRoot^.down;
   CopySubTree(clipTreePtr, trp);
   FileDirty[treeFile] := true;
  end;    { TreePaste }

  procedure TreeEdit;    { (trp: TreeRecPtr; Item_No: integer); }
 { An edit menu item has been selected when this trp window was active. }
    var
      i: integer;
  begin
    case Item_No of
      1:
        ;          {undo}
    { 2:              line divider}
      3:    {cut}
```

```
      TreeCut(trp);
    4:   {copy}
      TreeCopy(trp);
    5:   {paste}
      TreePaste(trp);
    6:   {clear}
      TreeClear(trp);
  end;  { case }
  trp^.dirty := true;
  if Item_No <> 4 then
    HookupFlag := true;    { Signal that DM's need to be rehooked up. }
end;   { TreeEdit }

procedure TreeMouse;  {• (trp : TreeRecPtr; •}
                      {•      ev : EventRecord);•}
  var
    tempPtr, oldEdPtr: PRecPtr;
    tp, tp2, stp: Point;
    orig3pt: Point3d;
    moveWorld: boolean;
  procedure findMouse (p: PRecPtr);
  begin
    tp2 := nDispPt(p^.gPt);
    if (abs(tp2.h - tp.h) < 5) and (abs(tp2.v - tp.v) < 5) then
      tempPtr := p;
  end;

begin
  SetPort(trp^.wp);
  stp := ev.where;
  GlobaltoLocal(stp);
  tp := stp;
  if (BitAnd(ev.modifiers, optionKey) <> 0) then
    begin
      oldEdPtr := trp^.edPtr;
      trp^.edPtr := trp^.TreeRoot;
      moveWorld := true;
      SetCursor(HandCurs^^);
    end
  else
    begin
      moveWorld := false;
      if (BitAnd(ev.modifiers, cmdKey) = 0) or (trp^.edPtr = nil) then
        begin
          tempPtr := nil;
          PostFixTreeWalk(trp^.TreeRoot, findMouse);
          trp^.edPtr := tempPtr;
        end;
    end;
  if (trp^.edPtr <> nil) and (not turnkey or moveWorld) then
    begin
      orig3pt := trp^.edPtr^.gPt;
      while StillDown do
```

```
        begin
          GetMouse(tp2);
          if not EqualPt(tp, tp2) then
            begin
              with trp^.edPtr^.gPt do
                begin
                  x := orig3pt.x + (tp2.h - stp.h);
                  y := orig3pt.y + (tp2.v - stp.v);
                end;
              unConvert(trp^.edPtr);
              ConstrainPt(trp^.edPtr);
              trp^.edPtr^.dirty := true;
              TreeRender(trp);
              FileDirty[treeFile] := true;
            end;
          tp := tp2;
        end;
    end;
  if moveWorld then
    begin
      trp^.edPtr := oldEdPtr;
      InitCursor;
    end;
  trp^.dirty := true;
  TreeRender(trp);
end;    { TreeMouse }

procedure Reduce (trp: TreeRecPtr);
{ Reduce the size of the world until it fits in the current window. }
  var
    hd, vd: integer;
    r: Rect;
    hreduc, vreduc: real;
begin
  ZeeZoom := 0;                     { get the normal size of the world. }
  trp^.TreeRoot^.dirty := true;
  TreeRender(trp);
  r := ChangedRect;                 { it's now in ChangedRect }
  with trp^.ThreeDRect do
    begin
      hreduc := (r.right - r.left) / ((right - left) * 0.90);
      vreduc := (r.bottom - r.top) / ((bottom - top) * 0.90);
    end;
  if (hreduc > 1) or (vreduc > 1) then
    begin
      if hreduc < vreduc then
        ZeeZoom := round(1024 * hreduc)
      else
        ZeeZoom := round(1024 * vreduc);
    end;
  repeat
    trp^.TreeRoot^.dirty := true;
    TreeRender(trp);
```

```
      trp^.TreeRoot^.dirty := true;
      TreeRender(trp);                    { Get new size of the world. }
      r := ChangedRect;                  { and put into r. }
      with trp^.ThreeDRect do
        vd := ((bottom - top) - (r.bottom - r.top)) div 2 + top;
      with trp^.TreeRoot^ do
        lSix.pt.y := lSix.pt.y - (r.top - vd);
      with trp^.ThreeDRect do
        hd := ((right - left) - (r.right - r.left)) div 2 + left;
      with trp^.TreeRoot^ do
        lSix.pt.x := lSix.pt.x - (r.left - hd);
    until ((r.top - vd) < 10) and ((r.left - hd) < 10);
    trp^.dirty := true;
  end;    { Reduce }

  procedure Zoom (onIn: boolean);
{ Change the display scale to zoom in or out. }
  begin
    if onIn then
      ZeeZoom := ZeeZoom - 300
    else
      ZeeZoom := ZeeZoom + 300;
    maintreeptr^.dirty := true;
  end;

{------------------------------------------------}
{ The following routines are called by dynamic menu items. }
  procedure doName (dyItem: integer);
  begin
    TreeChangeName(mainTreePtr);
  end;

  procedure doVector (dyItem: integer);
  begin
    TreeAddVector(mainTreePtr);
  end;

  procedure doZoom (dyItem: integer);
  begin
    Zoom(true);
  end;

  procedure doUnZoom (dyItem: integer);
  begin
    Zoom(false);
  end;

  procedure doNormal (dyItem: integer);
  begin
    ZeeZoom := 0;
    mainTreePtr^.dirty := true;
  end;
```

```
procedure doReduce (dyItem: integer);
begin
  Reduce(mainTreePtr);
end;

procedure doScale (dyItem: integer);
begin
  ScaleEditObj(mainTreePtr);
end;

procedure doOptions (dyItem: integer);
  const
    centRatio = 28.35;
    OptionsID = 2008;
    SwivInItem = 9;                        { First item of 'Points, Lines, Cubes' }
    SwivInItem1 = SwivInItem + 1;
    SwivInItem2 = SwivInItem + 2;
    RatioEditItem = 6;                     { Ratio Edit box. }
    RatioRadioItem = 12;                   { First of 'Pixels, Inches, CM' }
    RatioRadioItem1 = RatioRadioItem + 1;
    RatioRadioItem2 = RatioRadioItem + 2;
    QuickDItem = 16;                       { First of 'QuickDraw, ChuckDraw, Points' }
    ChuckDItem = QuickDItem + 1;
    PointsItem = ChuckDItem + 1;
    SwMergeItem = 19;                      { Merge with existing tree }
    SwDropItem = 20;                       { Drop Unnamed Objects }

    VectorEdItem = 22;                     { Vector length edit box. }

  var
    dlogPtr: DialogPtr;
    itemHit: Integer;
    str: str255;
    temp: TreeConfigRec;
    l: LongInt;
  procedure SetSwivRatio (r: real);
    var
      i: integer;
  begin
    temp.SwivRatio := r;
    SetEdText(dlogPtr, 2, StringOf(r : 3 : 3));
    if r = 1 then
      i := 0
    else if r = 72 then
      i := 1
    else if abs(r - centRatio) < 0.001 then
      i := 2
    else
      i := 5;
    RadioRange(dlogPtr, RatioRadioItem, 3, i);
  end;
begin
  temp := TreeConfig;
```

```
dlogPtr := GetNewDialog(OptionsID, nil, Pointer(-1));
PositionWindow(dlogPtr, 50, 10);
with temp do
  begin
    SetEdText(dlogPtr, 1, StringOf(PolygonSize : 1));
    NumToEditText(dlogPtr, VectorEdItem, VectorLen);
    RadioRange(dlogPtr, SwivInItem, 3, ord(SwivIn));
    RadioRange(dlogPtr, QuickDItem, 3, ord(lineState));
    SetSwivRatio(SwivRatio);
    ShowWindow(dlogPtr);
    RadioOn(dlogPtr, SwMergeItem, MergeSwiv);
    RadioOn(dlogPtr, SwDropItem, DropUnnamed);
    repeat
      ModalDialog(nil, itemHit);
      case itemHit of
        SwivInItem, SwivInItem1, SwivInItem2:
          begin
            SwivIn := SwivInType(itemHit - SwivInItem);
            RadioRange(dlogPtr, SwivInItem, 3, ord(SwivIn));
          end;
        QuickDItem, ChuckDItem, PointsItem:
          begin
            lineState := lineStateType(itemHit - QuickDItem);
            RadioRange(dlogPtr, QuickDItem, 3, ord(lineState));
          end;
        RatioRadioItem:
          SetSwivRatio(1.0);
        RatioRadioItem1:
          SetSwivRatio(72);
        RatioRadioItem2:
          SetSwivRatio(centRatio);
        RatioEditItem:                                    { user types char, hide button. }
          RadioRange(dlogPtr, RatioRadioItem, 3, 10);
        SwMergeItem:
          begin
            MergeSwiv := not MergeSwiv;
            RadioOn(dlogPtr, SwMergeItem, MergeSwiv);
          end;
        SwDropItem:
          begin
            DropUnnamed := not DropUnnamed;
            RadioOn(dlogPtr, SwDropItem, DropUnnamed);
          end;
      end;
    until itemHit <= 2;  { Until OK or Cancel is clicked. }
    if itemHit = 1 then
      begin { OK clicked. }
        GetEdText(dlogPtr, 1, str);
        VectorLen := getNumFromEditText(dlogPtr, VectorEdItem);
        StringtoNum(str, l);
        PolygonSize := l;
        GetEdText(dlogPtr, 2, str);
        SwivRatio := StringtoReal(str);
```

```
        TreeConfig := temp;
      end;
    end;
  DisposDialog(dlogPtr);
end;

procedure doTreeMenu; { (trp: TreeRecPtr; Item_No : integer) }
begin
  case Item_No of
    AddPtDItem:                    { Add Point Down }
      begin
        TreeAddPoint(trp, true, OptionIsDown or trp^.edPtr^.lDown);
        CheckTree(trp, true);
      end;
    AddObjDItem:                   { Add Object Down }
      begin
        TreeAddObj(trp);
        CheckTree(trp, true);
      end;
    AddPtRItem:                    { Add Point Right }
      begin
        TreeAddPoint(trp, false, OptionIsDown);
        CheckTree(trp, true);
      end;
    EdPtItem:                      { Edit Point }
      TreeEdPt(trp);
    FlickaItem:
      TogFlicka;
    PerspecItem:
      begin
        perspective := not perspective;
        CheckItem(TreeMHndl, PerspecItem, perspective);
        trp^.dirty := true;
      end;
    RefreshItem:
      begin
        eraseOld := not eraseOld;
        CheckItem(TreeMHndl, RefreshItem, eraseOld);
        TreeUpdate(trp);
      end;
    otherwise
      sysbeep(3);
  end;    { case }
end;   { TreeMenu }

procedure doTestMove (i: integer);
begin
  with mainTreePtr^ do
    if (edPtr <> nil) and (edPtr <> treeRoot) then
      begin
        MoveNode(edPtr, treeRoot);
      end;
end;
```

```
procedure TreeWResize (trp: TreeRecPtr);
  { Tree window has resized, Recalc the bitMap for the offscreen port so it only draws and erases}
  { the minimum sized rectangle.  Then recalc ThreeDsize which is the number of bytes to zero in the
      offscreen bitmap. }
  var
    i: integer;
    newScreenSize: longInt;
    tempBitMap: BitMap;
    oldPort: GrafPtr;
begin
  with tempBitMap do
    begin
      GetPort(oldPort);
      baseAddr := offScreenPort.portBits.baseAddr;
      bounds := trp^.wp^.portRect;
      with bounds do
        OffsetRect(tempBitMap.bounds, -left, -top);
      i := ((bounds.Right - bounds.Left + 7) div 8);
      if odd(i) then
        i := i + 1;
      rowBytes := i;
      SetPort(@offScreenPort);
      SetPortBits(tempBitMap);
      SetPort(oldPort);
      newScreenSize := LongInt(rowBytes) * (bounds.Bottom - bounds.Top);
      if newScreenSize > offScrnSize then
        newScreenSize := offScrnSize;
      with offScreenPort do
        ThreeDbaseAddr := Ptr(ord4(baseAddr) + (ThreeDRecttop * rowBytes));
      ThreeDsize := newScreenSize - (ThreeDRecttop * rowBytes);
    end
end;

procedure Init3D;
{ Call this at the begining of the program.  It initializes the 3d world }
  var
    i, j: integer;
    WRect: Rect;
    WType: integer;
    p: Ptr;
    tempBitMap: BitMap;
    configPtr: ^TreeConfigRec;
    h: Handle;


  procedure GetBigSinTab;
    const
      TrigRType = 'Ttab';
    var
      i, j: integer;
      k: real;
      h: handle;
```

```
      bh: ^bigSinTablePtr;
    begin
      h := GetResource(TrigRType, 3);
      if (h = nil) then
        begin    { Resource doesn't exist. Make it. }
          h := NewHandle(sizeOf(bigSinTableType));
          if (h = nil) then
            begin
              AnnounceB(StringOf('GetBigSinTab: NewHandle failed, fatal error.'));
              Finished := true;
              bsinPtr := nil;
              exit(GetBigSinTab);
            end;
          bh := Pointer(h);
          for i := 0 to 899 do
            bh^^[i] := round(sin((i / 10) * 0.01745327778) * 1024);
          AddResource(h, TrigRType, 3, 'bigSinTable');
          UpdateResFile(CurResFile);
        end;
      MoveHHi(h);
      HLock(h);
      bsinPtr := Pointer(h^);
    end;  { GetTrigTab }
    procedure TrigTables;
    begin
      GetBigSinTab;
      CSTBHandle := GetResource('CSTB', 131);
      if CSTBHandle = nil then
        AnnounceB('CSTB table not found.')
      else
        begin
          MoveHHi(CSTBHandle);
          HLock(CSTBHandle);
        end;
    end;  { TrigTables }

    procedure AddMenuStuff (mh: MenuHandle);
      var
        i: integer;
    begin
      i := dyNewItem(mh, 'Zoom/Z', @doZoom, true);
      i := dyNewItem(mh, 'UnZoom/U', @doUnZoom, true);
      i := dyNewItem(mh, 'Normal Size', @doNormal, true);
      i := dyNewItem(mh, 'Reduce to Fit', @doReduce, true);
      i := dyNewItem(mh, 'Scale Subtree', @doScale, true);
      i := dyNewItem(mh, 'Options...', @doOptions, true);
{ i := dyNewItem(mh, 'Test move', @doTestMove, true); }
    end;

  begin
    h := GetResource(TreeConfigRes, 0);
    if h <> nil then
      begin
```

```
      configPtr := pointer(h^);
      TreeConfig := configPtr^;
      ReleaseResource(Handle(h));
    end
  else
    with TreeConfig do
      begin
        PolygonSize := 3;
        SwivRatio := 1.0;
        SwivIn := InLines;
        lineState := ChuckDraw;
        MergeSwiv := true;
        DropUnnamed := true;
      end;
  AddMenuStuff(RenderMHndl);
  i := dyNewItem(TreeMHndl, 'Name', @doName, true);
  i := dyNewItem(TreeMHndl, 'Vector', @doVector, true);
  AddMenuStuff(TreeMHndl);
  InitTestVec;
  TrigTables;
  noFlick := false;
  showRect := false;
  eraseOld := true;
  CheckItem(TreeMHndl, RefreshItem, eraseOld);
  perspective := true;
  CheckItem(TreeMHndl, PerspecItem, perspective);
  ZeeZoom := 0;                { Zoom index. }
  RendOldClip := newRgn;       { old clip storage for TreeRender. }
  SetRect(LastenclRect, -30000, -30000, 30000, 30000);
  OpenPort(@offScreenPort);
  { Calculate the offscreen bitmap size, allocate memory and setup }
  { the bitmap. }
  tempBitMap.bounds := offScreenPort.portBits.bounds;
  with tempBitMap do
    begin
      i := ((bounds.Right - bounds.Left + 7) div 8);
      if odd(i) then
        i := i + 1;
      rowBytes := i;
      offScrnSize := LongInt(i) * (bounds.Bottom - bounds.Top);
      p := NewPtr(offScrnSize);
      baseAddr := p;
    end;
  with offScreenPort do
    if p <> nil then           { Memory got allocated for the offscreen bits. }
      begin
        SetPort(@offScreenPort);
        SetPortBits(tempBitMap);
        noFlick := true;
        TextSize(9);
        TextFont(monaco);
        eraseRect(thePort^.portRect);
        ThreeDbaseAddr := Ptr(ord4(p) + ThreeDRecttop * portBits.rowBytes);
```

```
      ThreeDsize := offScrnSize - (ThreeDRecttop * portBits.rowBytes);
    end;      { If memory got allocated. }
  CheckItem(TreeMHndl, FlickaItem, not noFlick);
end;    { Init3D }

procedure Close3D;
begin
  if mainTreePtr^.wp <> nil then
    SaveWindState(mainTreePtr^.wp, treeWindID);
  UseResFile(ApplRes);
  AddPtrResource(@TreeConfig, sizeof(TreeConfig), TreeConfigRes, 0, 'Tree configuration');
end;

{---------------------}
{      File I/O stuff      }
{---------------------}

function GetTree;{•     (trp : TreeRecPtr;•}
                    {•      vref : integer;•}
                    {•      fname : string):integer;•}
  var  { Try to get the tree from this file.  return 0 if successful. }
    ftrp: ^fileTreeRec;
    index, ResNum, err, oldVref, i, j: integer;
    str: str255;
    h, h2: Handle;
    rtype: ResType;
begin
  err := GetVol(nil, oldVref);
  err := SetVol(nil, vRef);
  if err = noErr then
    begin
      ResNum := OpenResFile(fName);
      if ResNum < 0 then
        err := ResError
      else
        begin
          h := Get1Resource(TreeResType, 0);
          if h = nil then
            err := resNotFound
          else
            begin
              HLock(h);
              ftrp := pointer(h^);
              if (ftrp^.version < treeVersion - 1) then
                err := 1024    { bad version }
              else
                begin
                  fNewTree(trp);
                  for i := 1 to MaxStorage do
                    if trp^.Storage[i] <> nil then
                      DisposeIt(trp, trp^.Storage[i]);
                  for index := 1 to Count1Resources(PRresType) do
                    begin          { First load all the nodes into memory. }
```

```
        h := Get1IndResource(PRresType, index);
        if h <> nil then
          begin
            GetResInfo(h, i, rtype, str);
            if (i >= 1) and (i <= MaxStorage) then
              begin
                DetachResource(h);
                if GetHandleSize(h) <> sizeof(PointRec) then
                  begin
                { Size of the pointrec has changed.  Make a new handle that's the right size }
                { and copy the info into it. }
                    h2 := h;
                    h := NewHandle(sizeof(PointRec));
                    ZeroMem(h^, sizeof(PointRec));
                    BlockMove(h2^, h^, MinOf(GetHandleSize(h2), GetHandleSize(h)));
                    DisposHandle(h2);
                  end;
                MoveHHi(h);
                HLock(h);
                trp^.Storage[i] := PRecPtr(StripAddress(h^));
              end;
          end;
      end;
    for i := 1 to maxStorage do
      begin
        if trp^.Storage[i] <> nil then
          begin
            trp^.Storage[i]^.up := IdxtoPtr(trp, trp^.Storage[i]^.up);
            trp^.Storage[i]^.down := IdxtoPtr(trp, trp^.Storage[i]^.down);
            trp^.Storage[i]^.right := IdxtoPtr(trp, trp^.Storage[i]^.right);
            trp^.Storage[i]^.rBandPtr := IdxtoPtr(trp, trp^.Storage[i]^.rBandPtr);
            if ord(trp^.Storage[i]^.ShowName) = 1 then
              trp^.Storage[i]^.ShowName := true
            else
              trp^.Storage[i]^.ShowName := false;
            if (ftrp^.version = 0) then
              with trp^.Storage[i]^ do
                begin    { Convert from rev 0 to rev 1. }
                  lSix.tt.yaw := gPt.x;
                  lSix.tt.pitch := gPt.y;
                  lSix.tt.roll := gPt.z;
                  SetDefaultMinMax(trp^.Storage[i]);
                end;
            if ftrp^.version = 1 then   { Convert angs from 0..359 to 0..3599. }
              with trp^.Storage[i]^ do
                begin
                  lSix.tt.yaw := lSix.tt.yaw * 10;
                  lSix.tt.pitch := lSix.tt.pitch * 10;
                  lSix.tt.roll := lSix.tt.roll * 10;
                  for j := 3 to 5 do
                    begin
                      mins.s[j] := mins.s[j] * 10;
                      maxs.s[j] := maxs.s[j] * 10;
```

```
                        end;
                    end;
                end;
            end;          { for i }
          if false then
            with trp^.TreeRoot^.lSix.pt do
              begin
                x := 0;
                y := 0;
                z := 0;
              end;
        end;               { tree resource version right. }
      with trp^ do
        begin
          NxtStor := ftrp^.NxtStor;
          treeRoot := IdxtoPtr(trp, ftrp^.treeRoot);
        end;
      h := RecoverHandle(Ptr(ftrp));
      ReleaseResource(h);
    end;                   { tree resource found }
    CloseResFile(ResNum);
  end;                     { OpenResFile worked }
end;                       { Setvol worked }
GetTree := err;
if err = 0 then
  begin
    trp^.edPtr := nil;
    makeGarbageList(trp);
    CheckTree(trp, true);
    trp^.dirty := true;
    InvalRect(trp^.wp^.portRect);
  end;
err := SetVol(nil, oldVref);
end;                       { GetTree }

function PutTree;   {•   (trp : TreeRecPtr;•}
                    {•    vref : integer;•}
                    {•    fname : string): integer;•}
{ Try to save the tree into this file. return true if successful. }
  var
    ftr: fileTreeRec;
    ResNum, err, oldVref, i: integer;
    fndrInfo: FInfo;
    temp: PointRec;
    h: Handle;

  procedure AddthisPoint (p: PRecPtr);
    var
      i: integer;
  begin
    for i := 0 to maxUnused do
      p^.unUsed[i] := 0;
    temp := p^;
```

```
    temp.up := Ptrtoldx(trp, temp.up);
    temp.down := Ptrtoldx(trp, temp.down);
    temp.right := Ptrtoldx(trp, temp.right);
    temp.rBandPtr := Ptrtoldx(trp, temp.rBandPtr);
    AddPtrResource(@temp, sizeof(PointRec), PRResType, PtrtoL(trp, p), '');
  end;

begin
  err := GetVol(nil, oldVref);
  err := SetVol(nil, vRef);
  if err = 0 then
    begin
      CreateResFile(fName);
      ResNum := OpenResFile(fName);
      if ResNum >= 0 then
        begin
          with ftr do
            begin
              version := TreeVersion;
              NxtStor := trp^.NxtStor;
              treeRoot := Ptrtoldx(trp, trp^.treeRoot);
              AddPtrResource(@ftr, sizeof(FileTreeRec), TreeResType, 0, 'Tree description');
            end;
          { Clean out any existing PointRec's in the file. }
          for i := 1 to Count1Resources(PRResType) do
            begin
              h := Get1IndResource(PRResType, i);
              if h <> nil then
                begin
                  RmveResource(h);
                  DisposHandle(h);
                end;
            end;
          { Add all the used PointRec's to the resource file. }
          PrefixTreeWalk(trp^.TreeRoot^.up, AddThisPoint);
          CloseResFile(ResNum);
          if err = 0 then
            err := GetFInfo(fName, vRef, fndrInfo);
          if err = 0 then
            begin
              fndrInfo.fdType := TreeFileType;
              fndrInfo.fdCreator := AppType;
              err := SetFInfo(fName, vRef, fndrInfo);
            end; { if GetFInfo worked. }
        end;    { if opened resource file }
    end;        { if set volume }
  PutTree := err;
  err := SetVol(nil, oldVref);
end;    { PutTree }

procedure TreePrint (var out: Text; trp: TreeRecPtr; name: string; forActa: Boolean);
{ Print the tree out the Output file. This is mostly for diagnostics. }
  function TabsFor (p: PRecPtr): string;
```

```
   var
     t: string;
  begin
   t := '';
   while p^.up <> nil do
     begin
       t := concat(t, chr(9));
       p := p^.up;
     end;
   TabsFor := t;
  end;
  procedure PrintActaNode (p: PRecPtr);
   const
     sp = ' ';
   var
     str: string;
  begin
   str := StringOf(TabsFor(p), '"', PRecName(p), '"');
   with p^.lSix.pt do
     str := StringOf(str, ' ', x : 1, ', ', y : 1, ', ', z : 1);
   with p^.lSix.tt do
     str := StringOf(str, ' : ', roll / 10 : 1 : 1, ', ', pitch / 10 : 1 : 1, ', ', yaw / 10 : 1 : 1);
   writeln(out, str);
  end;
  procedure PrintNode (p: PRecPtr);
  begin
   write(out, '[', PtrtoL(trp, p) : 2, ',', PtrtoL(trp, p^.up) : 2, ',');
   write(out, PtrtoL(trp, p^.down) : 2, ',', PtrtoL(trp, p^.right) : 2, ']');
   if p^.Lright then
     write(out, 'R')
   else
     write(out, 'r');
   if p^.Ldown then
     write(out, 'D')
   else
     write(out, 'd');
   with p^.lSix.pt do
     write(out, ', Loc: ', x : 3, ',', y : 3, ',', z : 3, ',');
   with p^.lSix.tt do
     writeln(out, ' Deg: ', roll : 3, ',', pitch : 3, ',', yaw : 3);
   with p^.gPt do
     write(out, '  Glob: ', x : 3, ',', y : 3, ',', z : 3);
   writeln(out, ', "', PRecName(p), '"');
  end;

begin
  if forActa then
   begin
     writeln(out, name);
     writeln(out, '"<name>", x, y, z: roll, pitch, yaw.');
     PreFixTreeWalk(trp^.treeRoot, PrintActaNode);
   end
  else
```

```
    PreFixTreeWalk(trp^.Storage[1], PrintNode);
  end;

{ Code to handle a popup menu of all tree points. }

  function alphaAddAt (var n: NameStr): integer;
      { Look for where alphabetically to add the given name. }
      { Do a binary search comparing against names already in the list. }
    var
      i, min, mid, max: integer;
      cmpStr: str255;
  begin
    max := CountMItems(tempPopMenu);
    min := 1;
    mid := min + (max - min) div 2;
    while max - min > 0 do
      begin           { while range to search on is more than 1. }
        mid := min + (max - min) div 2;
        GetItem(tempPopMenu, mid, cmpStr);
        i := RelString(n, cmpStr, false, true);
        case i of
          0: { equal, add here }
            max := min;
          -1:      { n < cmpStr, search below. }
            max := mid;
          1:    { n > cmpStr, search above. }
            begin
              mid := mid + 1;
              min := mid;
            end;
        end;  { case }
      end;    { while }
    alphaAddAt := mid;
  end;

  procedure MakePointNamesMenu;
    var
      i, j: integer;

    procedure addName (p: PRecPtr);
        { Add the name of this node to the alphabatized menu being made of all the tree names. }
      var
        i: integer;
    begin
      if p^.name <> '' then
        begin
          i := alphaAddAt(p^.name);
          InsMenuItem(tempPopMenu, p^.name, MaxOf(i - 1, 0));
        end;
    end;

  begin
    i := CountMItems(tempPopMenu);
```

```
    for j := 1 to i do
      DelMenuItem(tempPopMenu, 1);

    PreFixTreeWalk(mainTreePtr^.treeRoot, addName);
  end;

  function popUpPointNames (topLeft: point; var n: NameStr; var six: signedByte): Boolean;
      { popUpPointNames brings up the PointName popup menu.  It returns a string which}
      { corresponds to the name of the selected item. }
    var
      menuResult: longInt;
      lastOne: integer;
      str: str255;
  begin
    MakePointNamesMenu;
    if n = '' then
      lastOne := 1
    else
      lastOne := alphaAddAt(n);
    LocaltoGlobal(topLeft);
    menuResult := PopUpMenuSelect(tempPopMenu, topLeft.v - 3, topLeft.h - 3, lastOne);
    if LoWord(menuResult) <> 0 then
      begin
        lastOne := LoWord(menuResult);
        GetItem(tempPopMenu, lastOne, str);
        n := str;
        popUpPointNames := true;
      end
    else
      popUpPointNames := false;
  end;

  function popUpPointAxis (topLeft: point; var lastOne: signedByte): Boolean;
    { popUpPointAxis brings up a popup menu with the sixAxis in it. }
    var
      i, j: integer;
      menuResult: longInt;
  begin
    i := CountMItems(tempPopMenu);
    for j := 1 to i do
      DelMenuItem(tempPopMenu, 1);

    InsMenuItem(tempPopMenu, 'X', 1);
    InsMenuItem(tempPopMenu, 'Y', 2);
    InsMenuItem(tempPopMenu, 'Z', 3);
    InsMenuItem(tempPopMenu, 'Yaw', 4);
    InsMenuItem(tempPopMenu, 'Pitch', 5);
    InsMenuItem(tempPopMenu, 'Roll', 6);

    LocaltoGlobal(topLeft);
    menuResult := PopUpMenuSelect(tempPopMenu, topLeft.v, topLeft.h - 3, lastOne + 1);
    if LoWord(menuResult) <> 0 then
      begin
```

```
        lastOne := LoWord(menuResult) - 1;
        popUpPointAxis := true;
      end
    else
      popUpPointAxis := false;
  end;

end.
```

```
{ This unit has global definitions and variables that pertain to 3d trees. }
unit Tree3DGlob;

interface

  uses
    Globals;
  const
{$ifc Profile_On }
    MaxStorage = 100;           { maxinum number of points in a tree. }
{$elsec }
    MaxStorage = 400;           { maxinum number of points in a tree. }
{$endc }
    maxUnused = 20;

  type

    Point3d = record
        x, y, z: Integer;
      end;

    intCube = record
        minpt, maxpt: Point3d;
      end;

    RotTrip = record
        yaw, pitch, roll: integer
      end;

    SixArray = array[0..5] of integer;
    SixType = record
        case boolean of
          true: (
              pt: Point3d;
              tt: RotTrip;
          );
          false: (
              s: SixArray
          );
      end;
    SixPtrType = ^SixType;

             { lsb ---                                       msb }
    flagType = (Dline, Rline, out0, out1, out2, out3, out4, out5);
    flagSet = set of flagType;

{ PointRec is the record for one node on the 3d tree. }
    PRecPtr = ^PointRec;
    PointRec = record
        up, down, right: PRecPtr;
        lSix: SixType;          { lPt and trans have been combined into lSix. Local six-axis. }
        gPt: Point3d;           { absolute x,y and z coordinates, used to draw onscreen. }
```

```
        Ldown, Lright: boolean;
        name: nameStr;
        dirty, Changed: boolean;
        mins: SixType;          { minimum values for the local point and RotTrip. }
        maxs: SixType;          { maximum values for the local point and RotTrip. }
        rBandPtr: PRecPtr;
        lastDispPt: Point;
        flags: flagSet;         { down, right line and serial out bits. }
        showName: boolean;      { If true, display the name of the point to the right of the point on the screen.
        }
        SGIdirty: boolean;      { True if dirty since last send to SGI's. }
        sines: RotTrip;         { sine values for translation from this point up. }
        cosines: RotTrip;       { cosine values for translation from this point up. }
        bound: intCube;
        unused: array[0..maxUnused] of signedByte;
      end;

{ TreeRec has all the information for a 3d tree including the window it is rendered in }
    TreeRec = record
        wp: windowPtr;
        treeRoot, edPtr: PRecPtr;
        ThreeDRect: Rect;               { Rectangle the 3d display is clipped to }
        NxtStor: integer;
        dirty: boolean;         { True if the global points have to be recalculated. }
        storage: array[1..MaxStorage] of PRecPtr; { Points in the tree }
      end;
    TreeRecPtr = ^TreeRec;

    { Configuration record for some Default values used in making trees and reading/writing swivel trees. }
    SwivInType = (InPoints, InLines, InCubes, InBounds);
    lineStateType = (QuickDraw, ChuckDraw, NoDraw);
    TreeConfigRec = record
        PolygonSize: integer;       { Number of points to add in 'Add polygon down' }
        SwivRatio: real;
        SwivIn: SwivInType;
        lineState: LineStateType;
        MergeSwiv,                  { If True merge Import swivel with existing tree. }
        DropUnnamed: Boolean;       { If True dropped unnamed swivel objects when importing. }
        VectorLen: integer;         { Length to make the x,y,z vector }
      end;

  var
    mainTreePtr: TreeRecPtr;
    clipTreePtr: TreeRecPtr;
    currentNode: PRecPtr;
    TreeConfig: TreeConfigRec;

implementation
end.
```

```
unit TreeEdit;

interface

  uses
    FixMath, CompileTime, ChuckStuff, scottsStuff, FastStuff, AutoLib, Globals, Tree3DGlob,{}
    miscRoutines, TreeRender, formTree3D, SinCosTree;

  procedure TreeEdPt (trp: TreeRecPtr);
  procedure ScaleEditObj (trp: TreeRecPtr);
  procedure TreeChangeName (trp: TreeRecPtr);
  procedure TreeAddVector (trp: TreeRecPtr);
  procedure rTreeKey (trp: TreeRecPtr; key: char);

implementation

  const
    EdPtID = 2003;              { Edit Point dialog box ID. }
    EdPtNmItem = 1;             { Edit box number for the node name (1st edit field in the list) }
    PointNameItem = 5;          { Actual item number for the node name. }
    XaxisLabelItem = 24;

    EdPtfrstNumItem = 2;
    rBandEdItem = 20;           { rubber band edit item number. (2+18) }

    EdPtLDItem = 33;          { Line Down check box }
    EdPtLRItem = 34;          { Line right check box }
    EdBtnUpItem = 35;            { Up button }
    EdBtnDownItem = 36;          { Down button }
    EdBtnRightItem = 37;      { Right button }
    EdSerItems = 40;          { start of the send serial check boxes (0..5) }
    ShowNameItem = 47;        { Show Name check box. }

  procedure printGarbageList (trp: TreeRecPtr);
{ This is for diagnostics.  print the garbage list for this tree. }
    var
      p: PRecPtr;
      i, last: integer;
  begin
    write('Unused nodes');
    last := 0;
    write('[', last + 1 : 2);
    for i := 1 to MaxStorage do
      if trp^.Storage[i] = nil then
        begin
          if i <> last + 1 then
            write('..', last : 2, '] [', i : 2);
          last := i;
        end;
    write('..', last : 2, '] ');
    writeln;
  end;
```

```
  procedure TreeDisplay (trp: TreeRecPtr);
{ Display a graphical representation of the layout of the tree. }
   const
     horz = true;
   var
     r: Rect;
     wasNil: boolean;

   procedure PtDisp (p: PRecPtr;  { Draw the number for this point in a roundrect }
              var r: Rect);
     var
       str: string;
       r1: Rect;
   begin
     r.bottom := r.top + 14;
     if horz then
       r.right := r.left + 60
     else
       r.right := r.left + 40;
     r1 := r;
     InsetRect(r1, 2, 2);
     str := StringOf(PtrtoL(trp, p) : 1);
     str := PRecName(p);
     TextBox(Pointer(ord4(@str) + 1), length(str), r1, teJustRight);
     FrameRoundRect(r, 4, 4);
     if p = trp^.edPtr then
       begin
         r1 := r;
         InSetRect(r1, -1, -1);
         FrameRoundRect(r1, 4, 4);
       end;
   end;
   procedure TreeDisp (p: PRecPtr;    { Display this subtree. Return r with }
              var r: Rect);     { the size of the rectangle it took to }
     var                              { draw the display. }
       r1, r2: Rect;
       p1: PRecPtr;
   begin
     PtDisp(p, r);
     if p^.down <> nil then
       begin
         p1 := p^.down;
         if horz then
           begin
             r1.top := r.top;
             r1.left := r.right + 5;
           end
         else
           begin
             r1.left := r.left;
             r1.top := r.bottom + 5;
           end;
         while p1 <> nil do
```

```
        begin
          TreeDisp(p1, r1);
          UnionRect(r, r1, r);
          if horz then
            r1.top := r1.bottom + 5
          else
            r1.left := r1.right + 5;
          p1 := p1^.right;
        end;
      end;
  end;
begin
  wasNil := (trp^.wp = nil);
  if trp^.wp = nil then
    trp^.wp := mainTreePtr^.wp;
  SetPort(mainTreePtr^.wp);
  with mainTreePtr^.ThreeDRect do
    SetRect(r, left + 5, top + 5, 0, 0);
  if (trp^.edPtr <> nil) and false then
    TreeDisp(trp^.edPtr, r)
  else
    TreeDisp(trp^.TreeRoot^.up, r);
  if wasNil then
    trp^.wp := nil;
end;

procedure TreeEdPt; { (trp : TreeRecPtr); }
  { Edit the current edPtr.  This puts up the big dialog box that lets you edit all }
  { the parameters about the current edit point. }
  var
    dlogPtr: DialogPtr;
    ItemH: Handle;
    box: Rect;
    itemHit, i, j, rtype: Integer;
    l: LongInt;
    text: str255;
    nameChange: boolean;
    flag: flagType;

  procedure SetEdits (p: PRecPtr; selName: Boolean);
    var
      i: integer;
      str: string;
  begin
    SetEdText(dlogPtr, EdPtNmItem, PRecName(p));
    if selName then
      SelIText(dlogPtr, PointNameItem, 0, 32767);
    if p^.rBandPtr = nil then
      str := ''
    else
      str := PRecName(p^.rBandPtr);
    SetEdText(dlogPtr, rBandEdItem, str);
    for i := 0 to 2 do      { Set x,y and z. }
```

```
    begin
      SetEdText(dlogPtr, i + EdPtfrstNumItem, ntos(p^.ISix.s[i]));
      SetEdText(dlogPtr, i + 6 + EdPtfrstNumItem, ntos(p^.mins.s[i]));
      SetEdText(dlogPtr, i + 12 + EdPtfrstNumItem, ntos(p^.maxs.s[i]));
      RadioOn(dlogPtr, EdserItems + i, flagType(i + ord(out0)) in p^.flags);
    end;
  for i := 3 to 5 do     { Set roll pitch and yaw. }
    begin
      SetEdText(dlogPtr, i + EdPtfrstNumItem, StringOf(p^.ISix.s[i] / 10 : 3 : 1));
      SetEdText(dlogPtr, i + 6 + EdPtfrstNumItem, StringOf(p^.mins.s[i] / 10 : 3 : 1));
      SetEdText(dlogPtr, i + 12 + EdPtfrstNumItem, StringOf(p^.maxs.s[i] / 10 : 3 : 1));
      RadioOn(dlogPtr, EdserItems + i, flagType(i + ord(out0)) in p^.flags);
    end;
  RadioOn(dlogPtr, EdPtLDItem, p^.LDown);
  RadioOn(dlogPtr, EdPtLRItem, p^.LRight);
  RadioOn(dlogPtr, ShowNameItem, p^.ShowName);
  EnDisDItem(dlogPtr, EdBtnUpItem, p^.up <> trp^.TreeRoot^.up);
  EnDisDItem(dlogPtr, EdBtnDownItem, p^.down <> nil);
  EnDisDItem(dlogPtr, EdBtnRightItem, p^.right <> nil);
end; { SetEdits }

procedure GetEdits (p: PRecPtr);
  var
    i, j: integer;
  procedure GetValue (var int: integer; str: string; index: integer);
    var
      l: LongInt;
      r: Real;
  begin
    if index < 3 then
      begin
        StringtoNum(text, l);
        int := l
      end
    else
      begin
        r := StringtoReal(text);
        l := round(r * 10);
        int := degRange(l);
      end;
  end;
begin
  GetEdText(dlogPtr, EdPtNmItem, text);
  if PRecName(p) <> text then
    begin
      p^.name := text;
      nameChange := true;
    end;
  GetEdText(dlogPtr, rBandEditem, text);
  p^.rBandPtr := fFindTreeName(trp, text);
  for i := 0 to 5 do     { Get values from edit fields and set the integers  }
    begin
      GetEdText(dlogPtr, i + 6 + EdPtfrstNumItem, text);
```

```
      GetValue(p^.mins.s[i], text, i);
      GetEdText(dlogPtr, i + 12 + EdPtfrstNumItem, text);
      GetValue(p^.maxs.s[i], text, i);
      GetEdText(dlogPtr, i + EdPtfrstNumItem, text);
      GetValue(p^.lSix.s[i], text, i);
    end;
  end; { GetEdits }

begin
  nameChange := false;
  if trp^.edPtr = nil then
    sysbeep(3)
  else
    with trp^ do
      begin
        paramText(ntos(PtrtoL(trp, edPtr)), '', '', '');
        dlogPtr := GetNewDialog(EdPtID, nil, Pointer(-1));
        PositionWindow(dlogPtr, 50, 70);
        SetEdits(edPtr, true);
        ShowWindow(dlogPtr);
        SelIText(dlogPtr, PointNameItem, 0, 32767);
        repeat
          ModalDialog(nil, itemHit);
          if (itemHit >= EdserItems) and (itemHit < EdserItems + 6) then
            begin
              i := itemHit - EdserItems;
              flag := flagType(i + ord(out0));
              if flag in edPtr^.flags then
                edPtr^.flags := edPtr^.flags - [flag]
              else
                edPtr^.flags := edPtr^.flags + [flag];
              RadioOn(dlogPtr, EdserItems + i, flag in edPtr^.flags);
            end
          else if (itemHit >= XaxisLabelItem) and (itemHit < XaxisLabelItem + 6) then
            begin
              i := itemHit - XaxisLabelItem;
              GetEdits(edPtr);
              if optionIsDown then
                begin
                  if i < 3 then
                    begin
                      edPtr^.mins.s[i] := -20000;
                      edPtr^.maxs.s[i] := 20000;
                    end
                  else
                    begin
                      edPtr^.mins.s[i] := 0;
                      edPtr^.maxs.s[i] := 3599;
                    end;
                end
              else
                begin
                  edPtr^.mins.s[i] := edPtr^.lSix.s[i];
```

```
            edPtr^.maxs.s[i] := edPtr^.lSix.s[i];
          end;
        SetEdits(edPtr, false);
      end
    else
      case itemHit of
        EdPtLDItem:
          begin
            edPtr^.LDown := not edPtr^.LDown;
            RadioOn(dlogPtr, EdPtLDItem, edPtr^.LDown);
          end;
        EdPtLRItem:
          begin
            edPtr^.LRight := not edPtr^.LRight;
            RadioOn(dlogPtr, EdPtLRItem, edPtr^.LRight);
          end;
        ShowNameItem:
          begin
            edPtr^.ShowName := not edPtr^.ShowName;
            RadioOn(dlogPtr, ShowNameItem, edPtr^.ShowName);
          end;
        EdBtnUpItem, EdBtnDownItem, EdBtnRightItem:
          begin
            GetEdits(edPtr);
            ConstrainPt(edPtr);
            edPtr^.dirty := true;
            dirty := true;
            case itemHit of
              EdBtnUpItem:
                if edPtr^.up <> TreeRoot^.up then
                  edPtr := edPtr^.up;
              EdBtnDownItem:
                edPtr := edPtr^.down;
              EdBtnRightItem:
                edPtr := edPtr^.right;
            end;      { little case }
            paramText(ntos(PtrtoL(trp, edPtr)), '', '', '');
            SetEdits(edPtr, true);
            InvalRect(dlogPtr^.portRect);
          end;
      end;        { case }
  until itemHit <= 2; { Until OK or Cancel is clicked. }
  if itemHit = 1 then
    begin { OK clicked. }
      GetEdits(edPtr);
      ConstrainPt(edPtr);
      dirty := true;
      FileDirty[treeFile] := true;
    end; { if the user clicked OK. }
  DisposDialog(dlogPtr);
 end;
if nameChange then
  HookupFlag := true;    { Signal that DM's need to be rehooked up. }
```

```
  end;    { TreeEdPt }

  procedure oldScaleEditObj (trp: TreeRecPtr);
{ Scale the object defined by the tree below the current edit node by multiplying }
{ all of the relative X, Y, or Z values for the all the points in the tree.  }
    var
      xScale, yScale, zScale: real;
      str: string;
    procedure ScalePoint (p: PRecPtr);
    begin
      with p^ do
        begin
          lSix.pt.x := round(lSix.pt.x * xScale);
          lSix.pt.y := round(lSix.pt.y * yScale);
          lSix.pt.z := round(lSix.pt.z * zScale);
        end;
    end;
  begin
    if trp^.edPtr = nil then
      AnnounceB('No edit point specified. ')
    else
      begin
        ShowText;
        xScale := 1;
        writeln('Scale the tree below the edit point.');
        write('Scale X by [', xScale : 3 : 5, ']? ');
        readln(str);
        if length(str) <> 0 then
          xScale := StringtoReal(str);
        yScale := xScale;
        write('Scale Y by [', yScale : 3 : 5, ']? ');
        readln(str);
        if length(str) <> 0 then
          yScale := StringtoReal(str);
        zScale := yScale;
        write('Scale Z by [', zScale : 3 : 5, ']? ');
        readln(str);
        if length(str) <> 0 then
          zScale := StringtoReal(str);
        PreFixTreeWalk(trp^.edPtr^.down, ScalePoint);
        trp^.dirty := true;
      end;
  end;    { ScaleEditObj }

  procedure ScaleEditObj; {(trp : TreeRecPtr)}
{ Scale the object defined by the tree below the current edit node by multiplying }
{ all of the relative X, Y, or Z values for the all the points in the tree.  }
    const
      scaleID = 2022;
      xItem = 7;
      yItem = 8;
      zItem = 9;
      defaultItem = 10;
```

```
  var
    xScale, yScale, zScale: real;
    scaleBox: dialogPtr;
    oldPort: grafPtr;
    itemHit: integer;
    value: real;
    values: integer;
    h: handle;
    kind: integer;
    box: rect;

  procedure ScalePoint (p: PRecPtr);
  begin
    with p^ do
      begin
        lSix.pt.x := round(lSix.pt.x * xScale);
        lSix.pt.y := round(lSix.pt.y * yScale);
        lSix.pt.z := round(lSix.pt.z * zScale);
      end;
  end;

begin
  if trp^.edPtr = nil then
    AnnounceB('No edit point specified. ')
  else
    begin
      getPort(oldPort);
      scaleBox := GetNewDialog(scaleID, nil, pointer(-1));
      setPort(scaleBox);
      positionWindow(scaleBox, 50, 30);
      ShowWindow(scaleBox);

      repeat
        modalDialog(nil, itemHit);
        if itemHit = defaultItem then
          begin
            value := getREalfromEditText(scaleBox, defaultItem);
            for values := xItem to zitem do
              begin
                GetDItem(scaleBox, values, kind, h, box);
                SetItext(h, stringof(value : 3 : 4));
              end;
          end;
      until (itemHit = 1) or (itemHit = 2);

      if itemHit = 1 then
        begin
          xScale := getRealFromEditText(scaleBox, xItem);
          yScale := getRealFromEditText(scaleBox, yItem);
          zScale := getRealFromEditText(scaleBox, zItem);

          PreFixTreeWalk(trp^.edPtr^.down, ScalePoint);
          trp^.dirty := true;
```

```
      end;

    setPort(oldPort);
    disposDialog(scaleBox);
  end;
end;

procedure TreeChangeName (trp: TreeRecPtr);
  var
    str: Str255;
    i: integer;
begin
  with trp^ do
    if edPtr <> nil then
      begin
        str := edPtr^.name;
        if GetStrings('New name for this node?', '', str, str) then
          if length(str) <> 0 then
            begin
              edPtr^.name := str;
              dirty := true;
              HookupFlag := true;  { Signal that DM's need to be rehooked up. }
            end;
      end
    else
      sysbeep(3);
end;

procedure TreeClearAndPost (trp: TreeRecPtr);
  var
    i: integer;
begin
  TreeClear(trp);
  HookupFlag := true;  { Signal that DM's need to be rehooked up. }
end;

procedure TreeAddVector (trp: TreeRecPtr);
  { Add a vector below the edit point that shows the x,y,z orientation at that point.  If the }
  { point is already called VecName then delete it.  (Poor man's toggle) }
  const
    f = false;
    t = true;
    VecName = '_Vector_';
  var
    p, origP, baseP: PRecPtr;
    clearit: Boolean;
begin
  if trp^.edPtr = nil then
    begin
      sysbeep(3);
      exit(TreeAddVector);
    end;
```

```
clearit := false;
if trp^.edPtr^.name = VecName then                { if name we are sitting on is _Vector_ then clear it.
   }
  clearit := true
else if trp^.edPtr^.down <> nil then
  begin          { else search for_Vector_ one level down. }
    p := trp^.edPtr^.down;
    while p <> nil do
      begin
        if p^.name = VecName then
          begin
            clearit := true;
            trp^.edPtr := p;
            leave;
          end;
        p := p^.right;
      end;
  end;
if clearit then
  TreeClearAndPost(trp)
else
  begin
    origP := trp^.edPtr;
    baseP := InsertPt(trp, f, origP, 0, 0, 0, 0, 0, 0, f, t, VecName);      { Vector base }
    p := InsertPt(trp, f, baseP, TreeConfig.VectorLen, 0, 0, 0, 0, 0, f, f, 'X');
    p^.showName := true;
    p := InsertPt(trp, f, baseP, 0, TreeConfig.VectorLen, 0, 0, 0, 0, f, f, 'Y');
    p^.showName := true;
    p := InsertPt(trp, f, baseP, 0, 0, TreeConfig.VectorLen, 0, 0, 0, f, f, 'Z');
    p^.showName := true;
    trp^.edPtr := baseP^.up;
  end;

trp^.dirty := true;
FileDirty[treeFile] := true;
end;

procedure AddCube (trp: TreeRecPtr);
 { Add a cube that is the size of the edit point's bounding box down from the edit point. }
 var
   oldPoly: integer;
   p, face1, face2: PRecPtr;
   xdif, ydif: integer;
   clearcube: Boolean;

 procedure SetFacePoint2 (f1, f2: PRecPtr; x1, y1, x2, y2: LongInt);
 begin
   with f1^.lSix.pt do
     begin
       x := x1;
       y := y1;
     end;
   with f2^.lSix.pt do
```

```
      begin
        x := x2;
        y := y2;
      end;
    f1^.rBandPtr := f2;
  end;


begin
  if trp^.edPtr = nil then
    exit(AddCube);

  clearcube := false;
  if pos('_cube_', trp^.edPtr^.name) <> 0 then      { if name we are sitting on has _cube_ then clear it. }
    clearcube := true
  else if trp^.edPtr^.down <> nil then
    begin         { else search for _cube_ one level down. }
      p := trp^.edPtr^.down;
      while p <> nil do
        begin
          if pos('_cube_', p^.name) <> 0 then
            begin
              clearcube := true;
              trp^.edPtr := p;
              leave;
            end;
          p := p^.right;
        end;
    end;
  if clearcube then
    TreeClearAndPost(trp)
  else
    begin
      oldPoly := TreeConfig.PolygonSize;
      p := trp^.edPtr;
      TreeConfig.PolygonSize := 4;
      TreeAddPoint(trp, true, false);
      if (trp^.edPtr <> nil) then
        begin
          trp^.edPtr^.name := copy(concat(p^.name, '_cube_'), 1, nameSize);
          with trp^.edPtr^.ISix.pt do
            begin
              x := 0;
              y := 0;
              z := 0;
            end;
          TreeAddObj(trp);
          face1 := trp^.edPtr^.down;
          while face1^.right <> nil do
            face1 := face1^.right;
          TreeAddObj(trp);
          if (trp^.edPtr <> nil) then
            begin
```

```
          trp^.edPtr := trp^.edPtr^.up;
          face2 := face1^.right;
          with p^.bound do
            begin
              face1^.lSix.pt := minPt;
              face2^.lSix.pt := maxPt;
              xdif := maxPt.x - minPt.x;
              ydif := maxPt.y - minPt.y;

              face1 := face1^.down;
              face2 := face2^.down;
              SetFacePoint2(face1, face2, 0, 0, -xdif, -ydif);
              face1 := face1^.right;
              face2 := face2^.right;
              SetFacePoint2(face1, face2, 0, ydif, -xdif, 0);
              face1 := face1^.right;
              face2 := face2^.right;
              SetFacePoint2(face1, face2, xdif, ydif, 0, 0);
              face1 := face1^.right;
              face2 := face2^.right;
              SetFacePoint2(face1, face2, xdif, 0, 0, -ydif);
            end;
          end;
        end;
      TreeConfig.PolygonSize := oldPoly;
    end;
  end;

{ Handle key's for this window }
  procedure rTreeKey;        { • (trp : TreeRecPtr;•}
                            {•      key : char);•}

    const
      upArrow = chr(30);
      downArrow = chr(31);
      rightArrow = chr($1d);
      leftArrow = chr($1c);
      opt_h = chr($fa);
      opt_Z = chr($f3);
      BackSpace = chr(8);
      ClearKey = char(27);

    var
      str, str1: str255;
      ch: char;
      i, j, err: integer;
      p: PRecPtr;
      temp: Point3d;

  begin
    with trp^ do
      case key of
        'l':
```

-000761

```
      SetSixth(TreeRoot, 4, TreeRoot^.ISix.tt.pitch + 50);
    'M':
      SetSixth(TreeRoot, 4, TreeRoot^.ISix.tt.pitch - 50);
    'K':
      SetSixth(TreeRoot, 5, TreeRoot^.ISix.tt.roll + 50);
    'J':
      SetSixth(TreeRoot, 5, TreeRoot^.ISix.tt.roll - 50);
    'O':
      SetSixth(TreeRoot, 3, TreeRoot^.ISix.tt.yaw + 50);
    'U':
      SetSixth(TreeRoot, 3, TreeRoot^.ISix.tt.yaw - 50);
{$ifc Debug }
    '©':        { option g }
      PrintGarbageList(trp);
    '∂':        { option d }
      begin
        TreeDisplay(trp);
        repeat
        until button;
      end;
    'Î':        { option D }
      begin
        TreeDisplay(clipTreePtr);
        repeat
        until button;
      end;
    'ß':        { option-s }
      ShowRect := not ShowRect;
{$endc }
    '?':
      begin
        Announce('Tree window keys:');
        Announce('i,j,k,m,u,o - Rotate the edit point. I,J,K,M,U,O - Rotate the world.');
        Announce('Keyboard Arrows - Tree Traversal, n - Name edit point, v - Add vector.');
        Announce('d - Line down, r - Line right, b - Add Swivel3D bounding cube.');
{$ifc Debug }
        Announce('opt s - Show enclosing Rect.  opt c - Circlize edit point.');
        Announce('opt d - Display tree, opt D - Display clipboard.');
{$endc }
      end;
    otherwise
      if edPtr <> nil then
        begin
          case key of
            'i':
              SetSixth(edPtr, 4, edPtr^.ISix.tt.pitch + 50);
            'm':
              SetSixth(edPtr, 4, edPtr^.ISix.tt.pitch - 50);
            'k':
              SetSixth(edPtr, 5, edPtr^.ISix.tt.roll + 50);
            'j':
              SetSixth(edPtr, 5, edPtr^.ISix.tt.roll - 50);
            'o':
```

```
  SetSixth(edPtr, 3, edPtr^.ISix.tt.yaw + 50);
'u':
  SetSixth(edPtr, 3, edPtr^.ISix.tt.yaw - 50);
'x':
  SetSixth(edPtr, 0, edPtr^.ISix.pt.x - 10);
'X':
  SetSixth(edPtr, 0, edPtr^.ISix.pt.x + 10);
'y':
  SetSixth(edPtr, 1, edPtr^.ISix.pt.y - 10);
'Y':
  SetSixth(edPtr, 1, edPtr^.ISix.pt.y + 10);
'z':
  SetSixth(edPtr, 2, edPtr^.ISix.pt.z - 10);
'Z':
  SetSixth(edPtr, 2, edPtr^.ISix.pt.z + 10);
'≈':            { option x } .
  SetSixth(edPtr, 0, edPtr^.ISix.pt.x - 50);
'Ù':        { option X }
  SetSixth(edPtr, 0, edPtr^.ISix.pt.x + 50);
'¥':        { option y }
  SetSixth(edPtr, 1, edPtr^.ISix.pt.y - 50);
'Á':        { option Y }
  SetSixth(edPtr, 1, edPtr^.ISix.pt.y + 50);
'Ω':        { option z }
  SetSixth(edPtr, 2, edPtr^.ISix.pt.z - 50);
'Û':        { option Z }
  SetSixth(edPtr, 2, edPtr^.ISix.pt.z + 50);
'd', 'D':
  edPtr^.Ldown := not edPtr^.Ldown;
'r', 'R':
  edPtr^.Lright := not edPtr^.Lright;
upArrow: { up arrow }
  if edPtr^.up <> TreeRoot^.up then
    edPtr := edPtr^.up
  else
    sysbeep(1);
rightArrow:   { right arrow }
  if edPtr^.right <> nil then
    edPtr := edPtr^.right
  else
    sysbeep(1);
downArrow:  { down arrow }
  if edPtr^.down <> nil then
    edPtr := edPtr^.down
  else
    sysbeep(1);
leftArrow:   { left arrow }
  if edPtr^.up^.down <> edPtr then
    begin
      p := edPtr;
      edPtr := edPtr^.up^.down;
      while edPtr^.right <> p do
        edPtr := edPtr^.right;
```

```
            end
          else
            sysbeep(1);
        'n', 'N':
          TreeChangeName(trp);
        'v', 'V':
          TreeAddVector(trp);
        'b', 'B':       { b }
          AddCube(trp);
        'ç':
          Circleize(trp^.edPtr, 0);
        BackSpace, ClearKey:
          TreeClearAndPost(trp);
        'a':
          begin
            LoctoGlobRot(trp^.edPtr);
            GlobtoLocRot(trp^.edPtr);
          end;
        's':
          begin
            temp := trp^.edPtr^.gPt;
            CalcSinCosPath(trp^.edPtr);
            SinCosConvert(trp^.edPtr);
            if temp.x <> trp^.edPtr^.gPt.x then
              begin
              end;
          end;
        otherwise
          ;
      end;
      ConstrainPt(edPtr);
    end;  { otherwise if edPtr <> nil then case }
  end; { with, case }
  trp^.dirty := true;
  FileDirty[treeFile] := true;
end;   { rTreeKey }

end.
```

```
unit TreeRender;

interface

  uses
    AutoLib, ChuckStuff, FastStuff, Globals, Tree3DGlob, formTree3D;

  var
    offScreenPort: GrafPort;
    offScrnSize: longInt;       { Size in bytes of the offscreen bit map. }
    ThreeDsize: longint;          { Size clipped to the top of ThreeDRect. }
    ThreeDbaseAddr: Ptr;          { Address of the offscreen bit map clipped to ThreeDRect. }
    noFlick: boolean;             { True if making the tree not flicker. }
    showRect, eraseOld: boolean;
    RendOldClip: RgnHandle;
    LastenclRect, ChangedRect: Rect;

  procedure rTreeUpdate (trp: TreeRecPtr);
  procedure TreeRender (trp: TreeRecPtr);

implementation

  procedure TreeDraw (trp: TreeRecPtr);
{ This both draw's the tree and gathers into ChangedRect the minimum rectangle }
{ on the screen that has been changed since the last rendering. }
    var
      i, bandNum: integer;
      tpt: Point;
      rBands: array[0..100] of record
          fpt: Point;
          toPtr: PRecPtr;
          frmChanged: boolean;
        end;
      r: Rect;

    procedure doLineTo (h, v: integer);
    begin
      case TreeConfig.lineState of
        QuickDraw:
          LineTo(h, v);
        ChuckDraw:
          cbLineTo(h, v);
        NoDraw:
          begin
            MoveTo(h, v);
            cbLine(0, 0);
          end;
      end;
    end;

    procedure SubTreeDraw (p: PRecPtr; downline: boolean; frmPt: Point);
      { Modified 12/22/88 so if a point has LineDown true then it will draw a line }
```

```
    { down to each subpoint, not just the first subpoint. }
   var
    dp, strp: Point;
    r, r2: Rect;
    firstChanged, lastChanged, firstTime, lineIt: boolean;
  begin
   firstchanged := p^.Changed;
   lastchanged := false;
   firstTime := true;          { firstime is just to close polygons. }
   lineIt := false;
   repeat
    with p^ do
     begin
      if Changed or lastChanged then
       begin   { this point has moved, draw it and include it in the changedRect. }
        dp := nDispPt(gPt);
        if lineIt then
         Pt2Rect(thePort^.pnLoc, dp, r)
        else
         with dp do
          begin
           r.left := h;
           r.top := v;
           r.right := h + 1;
           r.bottom := v + 1;
          end;
        if Changed and downline then
         begin       { If drawing a line down from the parent include it }
          if true then
           begin
            Pt2Rect(frmPt, dp, r2);
            UnionRect(r, r2, r);
           end
          else
           UnionPoints(r, dp, frmPt);        { appearently this routine still doesn't work }
         end;
        if ChangedRect.left = -3333 then
         ChangedRect := r
        else
         UnionRect(ChangedRect, r, ChangedRect);
        if showName then
         begin       { Include the name rectangle in the changed rect. }
          r.top := dp.v - 10;
          r.left := dp.h;
          r.bottom := dp.v + 8;
          r.right := dp.h + StringWidth(Name) + 4;
          UnionRect(ChangedRect, r, ChangedRect);
         end;
        with lastDispPt do
         begin       { Include the last point into the changed rect. }
          r.left := h;
          r.top := v;
          r.right := h + 1;
```

```
        r.bottom := v + 1;
        UnionRect(ChangedRect, r, ChangedRect);
        if showName then
          begin      { Include the name rectangle in the changed rect. }
            r.top := v - 10;
            r.left := h;
            r.bottom := v + 8;
            r.right := h + StringWidth(Name) + 4;
            UnionRect(ChangedRect, r, ChangedRect);
          end;
      end;
    lastDispPt := dp;
  end
else
  dp := lastDispPt;
if firstTime then
  begin
    strp := dp;          { save start point to close polygons. }
    firstTime := false;
  end;
if lineIt then                  { Draw line from last to this point. }
  doLineTo(dp.h, dp.v)
else
  begin                         { Just set a pixel for this point. }
    MoveTo(dp.h, dp.v);
    Line(0, 0);
  end;
if downline then
  begin          { Draw line from parent to this point }
    MoveTo(frmPt.h, frmPt.v);
    doLineTo(dp.h, dp.v);
  end;
if showName then
  begin      { Draw the name to the right of the point and add it's size }
    moveto(dp.h + 3, dp.v + 5);
    DrawString(Name);
    MoveTo(dp.h, dp.v);
  end;
if p = trp^.EdPtr then
  begin      { This is the edit point, draw square block. }
    with dp do
      SetRect(r, h - 1, v - 1, h + 2, v + 2);
    FrameRect(r);
  end;
lineIt := Lright;
if down <> nil then
  begin      { go down the tree and draw subtree from this point. }
    SubTreeDraw(down, Ldown, dp);
    if lineit then
      moveto(dp.h, dp.v);
  end;
if rBandPtr <> nil then
  begin
```

```
          with rBands[bandNum] do
            begin
              fpt := dp;
              toPtr := rBandPtr;
              frmChanged := Changed;
            end;
          bandNum := bandNum + 1;
        end;
      lastChanged := Changed and lineit;
    end;
  p := p^.right;
  until p = nil;
  if lineIt then
    begin
      if lastChanged or firstChanged then
        begin
          if true then
            begin
              Pt2Rect(frmPt, dp, r2);
              UnionRect(ChangedRect, r2, ChangedRect);
            end
          else
            UnionPoints(ChangedRect, dp, frmPt);     { appearently this routine still doesn't work }
        end;
      doLineTo(strp.h, strp.v); { close polygon }
    end;
  end;      { SubTreeDraw }

begin
  bandNum := 0;
  SubTreeDraw(trp^.TreeRoot, false, tpt);
  for i := 0 to bandNum - 1 do
    with rBands[i] do
      begin
        tpt := nDispPt(toPtr^.gPt);
        moveto(fpt.h, fpt.v);
        doLineTo(tpt.h, tpt.v);
        if frmChanged or toPtr^.Changed then
          begin
            Pt2Rect(fpt, tpt, r);
            UnionRect(ChangedRect, r, ChangedRect);
          end;
      end;
end;   { TreeDraw }

procedure DrawText (trp: TreeRecPtr);
  var
    str: string;
    r: Rect;
begin
  with trp^.ThreeDRect do
    SetRect(r, left, 0, right, top - 2);
  eraseRect(r);
```

```
   if trp^.edPtr <> nil then
     begin
       str := PRecName(trp^.edPtr);
       moveto(5, 10);
       DrawString(StringOf('[', PtrtoL(trp, trp^.edPtr) : 3, '] Name: ', str));
       moveto(5, 20);
       with trp^.edPtr^.lSix.pt do
         DrawString(StringOf('X= ', x : 3, ' Y= ', y : 3, ' Z= ', z : 3));
       with trp^.edPtr^.lSix.tt do
         begin
           str := Concat(', Y= ', Include('.', StringOf(yaw : 4), 4), ' P= ', Include('.', StringOf(pitch : 4),
      4));
           DrawString(Concat(str, ', R= ', Include('.', StringOf(roll : 4), 4)));
         end;
     end;
 end;

 procedure TreeRender;{ trp: TreeRecPtr) }
{ Render the tree into the tree window if the window is on.  The tree hasn't been walked yet so do so. }
   var
     r, r1, enclRect: Rect;
     maxz: integer;
     oldPort: GrafPtr;
 begin
   if WindowOn(trp^.wp) then
     begin
       GetPort(oldPort);
       if noFlick and (trp = mainTreePtr) then
         SetPort(@offScreenPort)
       else
         SetPort(trp^.wp);
       GetClip(RendOldClip);
       ClipRect(trp^.ThreeDRect);
{$ifc Profile_On }
       trp^.dirty := true;
{$endc }
       if trp^.dirty then
         ChangedRect := trp^.ThreeDRect
       else
         SetRect(ChangedRect, -3333, 0, 0, 0);
       if trp^.TreeRoot = nil then
         begin
           AnnounceB(StringOf('TreeRoot = nil, trp = ', trp : 1, ', @storage = ', @trp^.storage : 1));
           repeat
           until Button and OptionIsDown;
         end;
       dirtyTreeWalk(trp^.TreeRoot, trp^.dirty);
       if eraseOld then
         if noFlick then
           zeroMem(ThreeDBaseAddr, ThreeDsize)
         else
           eraseRect(trp^.ThreeDRect);
       TreeDraw(trp);
```

```
        SetClip(RendOldClip);
        if trp^.dirty or (trp^.edPtr <> nil) then
          DrawText(trp);
        if (trp = mainTreePtr) then
          if noFlick then
            with trp^.wp^ do
              begin
                SetPort(trp^.wp);
                enclRect := ChangedRect;
                InsetRect(enclRect, -2, -2);
                UnionRect(enclRect, LastenclRect, r);
                LastenclRect := enclRect;
                r.left := MaxOf(r.left, 0);      { These are because of a color }
                r.top := MaxOf(r.top, 0);        { quickdraw bug. }
                CopyBits(offScreenPort.portBits, portBits, r, r, srcCopy, nil);
                if (trp^.edPtr <> nil) or trp^.dirty then
                  begin
                    with trp^.ThreeDRect do
                      SetRect(r1, left, 0, right, top - 2);
                    CopyBits(offScreenPort.portBits, portBits, r1, r1, srcCopy, nil);
                  end;
                if showRect then
                  framerect(r);
              end;
        trp^.dirty := false;
        SetPort(oldPort);
      end;    { if there is a window to draw into. }
  end;

{ Handle update event for this tree's window.  This is the real TreeUpdate. }
{ TreeUpdate in Tree3d.pas just calls this routine. }
  procedure rTreeUpdate;{* trp: TreeRecPtr) *}
    var
      ps: PenState;
      r: rect;
  begin
    SetPort(trp^.wp);
    SetRect(r, -30000, -30000, 30000, 30000);
    ClipRect(trp^.wp^.portRect);
    eraseRect(trp^.wp^.portRect);
    DrawGrowIcon(trp^.wp);
    GetPenState(ps);
    PenNormal;
    PenSize(2, 2);
    with trp^.ThreeDRect do
      begin
        right := trp^.wp^.portRect.right - 15;
        bottom := trp^.wp^.portRect.bottom - 15;
        moveto(left, top - 2);
        lineto(right - 1, top - 2);
        ScreenH := (right - left) div 2 + left;
        ScreenV := (bottom - top) div 2 + top;
        SetRect(r, left, 0, right, bottom);
```

```
      ClipRect(r);
    end;
  SetPenState(ps);
  if offScreenPort.portBits.baseAddr <> nil then
    with trp^.wp^ do
      CopyBits(portBits, offScreenPort.portBits, portRect, portRect, srcCopy, nil);
  trp^.dirty := true;
  TreeRender(trp);
 end;

end.
```

04/23/90 10:30 TrigDMs.pas Page 1

```
{ This is a colection of Trigonomic Data Massage Modules.  None of these use any }
{ private storage, they don't do any calibration and they all use GenericHandle to }
{ handle anything other than the massage data message. }

unit TrigDMs;
interface
  uses
    ChuckStuff, FastStuff, Globals, Tree3DGlob, MiscRoutines, formTree3D, Tree3D, DMTypes, DMGlobals;

  procedure doArcDiv (var dm: DMRec);          { output0 := arctan( input0 / input1 ); }
  procedure doPythagorean (var dm: DMRec);     { output0 := sqrt( input0*input0 + input1*input1); }

  procedure doAng3Side (var dm: DMRec);        { output(angle) =  arccos( sqr(b) + sqr(c) - sqr(a) ) /
       2*b*c  ) ; }

  procedure doRightTriSine (var dm: DMRec);    { output(angle) =  arcsin( oposite / hypotenus )  ; }
  procedure doSineLaw (var dm: DMRec);         { output(angle) = arcsin( ( in1 * sin(in2) ) / in3 ); }

  procedure doArmPitches (var dm: DMRec);      { Specifically to handle Yashco robot arm pitches.  See
       procedure }

  procedure doAngleBetweenPoints (var dm: DMRec);  {returns the angle between points a and b in
       degrees from 0 to 360}
                                                  {input 1 (or 0) is a trigger.  when non-zero it
       works}

  procedure doFastPyth (var dm: DMRec);        { output0 = distance between input 1 and input 2 }

implementation

  const
    RadtoDeg = 572.9577951;          { 1800 / pi.  radian to degree(*10) ratio. }
    DegtoRad = 0.0017453292;

  procedure doFastPyth;
    { pythagarian done without square root.}
    { out1 = sqrt(in1*in1 + in2*in2) }
    var
      dh, dv: integer;
  begin
    dh := abs(dm.SlotsIn[0].ptrfrm^.i);
    dv := abs(dm.SlotsIn[1].ptrfrm^.i);

    with dm, dm.PointsOut[0] do
      begin
        if (dv > dh) then
          LastValue.i := round(((dh + dv) + (2 * dv)) / 3)
        else
          LastValue.i := round(((dh + dv) + (2 * dh)) / 3);
        if ptrto <> nil then
          SetSixth(ptrto, ord(SixAxis), LastValue.i);
      end;
  end;
```

```
procedure doArcDiv;
  { output1 := arctan( input1 / input2 ); }
  var
    input0, input1: integer;
begin
  input0 := dm.SlotsIn[0].ptrfrm^.i;
  input1 := dm.SlotsIn[1].ptrfrm^.i;
  with dm, dm.PointsOut[0] do
    begin
      if (input0 <> PrivateWords[0]) or (input1 <> PrivateWords[1]) then
        begin
          LastValue.i := round(arctan((input0 / input1)) * RadtoDeg);
          PrivateWords[0] := input0;
          PrivateWords[0] := input1;
        end;
      if ptrto <> nil then
        SetSixth(ptrto, ord(SixAxis), LastValue.i);
    end;
end;

procedure doPythagorean;
{ output0 := sqrt( input0*input0 + input1*input1); }
  var
    input0, input1: integer;
begin
  input0 := dm.SlotsIn[0].ptrfrm^.i;
  input1 := dm.SlotsIn[1].ptrfrm^.i;
  with dm, dm.PointsOut[0] do
    begin
      if (input0 <> PrivateWords[0]) or (input1 <> PrivateWords[1]) then
        begin
          LastValue.i := round(sqrt((input0 * input0) + (input1 * input1)));
          PrivateWords[0] := input0;
          PrivateWords[0] := input1;
        end;
      if ptrto <> nil then
        SetSixth(ptrto, ord(SixAxis), LastValue.i);
    end;
end;

procedure doAng3Side;
{ output(angle) = Ang_arccos( sqr(b) + sqr(c) - sqr(a) ) / 2*b*c ) ; }
  var
    a, b, c: integer;
begin
  a := dm.SlotsIn[0].ptrfrm^.i;
  b := dm.SlotsIn[1].ptrfrm^.i;
  c := dm.SlotsIn[2].ptrfrm^.i;
  with dm, dm.PointsOut[0] do
    begin
```

```
      if (a <> PrivateWords[0]) or (b <> PrivateWords[1]) or (c <> PrivateWords[2]) then
        begin
          LastValue.i := Ang_arccos((b * b + c * c - (a * a)) / (2 * b * c));
          PrivateWords[0] := a;
          PrivateWords[1] := b;
          PrivateWords[2] := b;
        end;
      if ptrto <> nil then
        SetSixth(ptrto, ord(SixAxis), LastValue.i);
    end;
  end;

  procedure doRightTriSine;
{ output(angle) = Ang_arcsin( oposite / hypotenus ) ; }
    var
      a, b: integer;
  begin
    a := dm.SlotsIn[0].ptrfrm^.i;
    b := dm.SlotsIn[1].ptrfrm^.i;
    with dm, dm.PointsOut[0] do
      begin
        if (a <> PrivateWords[0]) or (b <> PrivateWords[1]) then
          begin
            LastValue.i := Ang_arcsin(a / b);
            PrivateWords[0] := a;
            PrivateWords[1] := b;
          end;
        if ptrto <> nil then
          SetSixth(ptrto, ord(SixAxis), LastValue.i);
      end;
  end;

  procedure doSineLaw;
{ law of sines says side_a / sine(ang_A) = side_b / sine(ang_B) }
{ input #1 = opposite, input #2 = ang_B, input #3 = side_b }
{ output(angle) = Ang_arcsin( ( oposite * sin(ang_B) ) / side_b ); }
    var
      opposite, ang_B, side_b: integer;
  begin
    opposite := dm.SlotsIn[0].ptrfrm^.i;
    ang_B := dm.SlotsIn[1].ptrfrm^.i;
    side_b := dm.SlotsIn[2].ptrfrm^.i;
    with dm, dm.PointsOut[0] do
      begin
        if (opposite <> PrivateWords[0]) or (ang_B <> PrivateWords[1]) or (side_b <> PrivateWords[2])
        then
          begin
            LastValue.i := Ang_arcsin((opposite * sin(ang_B * DegtoRad)) / side_b);
            PrivateWords[0] := opposite;
            PrivateWords[1] := ang_B;
            PrivateWords[2] := side_b;
          end;
        if ptrto <> nil then
```

```
      SetSixth(ptrto, ord(SixAxis), LastValue.i);
    end;
  end;


  procedure doArmPitches;
{ Inputs = 0 - Wx  polhemusX - top of shoulderX }
{          1 - Wz  polhemusZ - top of shoulderZ}
{          2 - Au  shoulder to elbow length }
{          3 - Af  elbow to wrist length }
{          4 - Py polhemusY - bottom of shoulderY }
{ Outputs = 0 - Shoulder angle }
{           1 - Elbow angle }
{  Ah = Sqrt( sqr(Wh) + sqr(Py - Sy) )                         pythagorean }

{  Elbow angle = Ang_arccos ( sqr ( Au ) + sqr ( Af ) - sqr ( Ah ) ) / 2 * Au * Af )      law of cosines , 3
      sides }
{  ß2 = Ang_arcsin ( ( Af * sin ( Ω  ) ) / Ah )                law of sines ß }
{  ß1 = Ang_arcsin ( ( Py - Sy ) / Ah )                        right triangle sine }
{ Shoulder angle = ß1 + ß2. }

    var
      Wx, Wz, Au, Af, Py, minShoulder: real;
      Beta1, Beta2, Wh, sqrWh, Ah, sqrAh, ElbowAngle, newElbow, gamma, c: real;
  begin
    with dm do
      begin
        Wx  := SlotsIn[0].ptrfrm^.i;
        Wz  := SlotsIn[1].ptrfrm^.i;
        Au  := SlotsIn[2].ptrfrm^.i;
        Af  := SlotsIn[3].ptrfrm^.i;
        Py  := SlotsIn[4].ptrfrm^.i;
        minShoulder  := SlotsIn[5].ptrfrm^.i;
        sqrWh := (Wx * Wx + Wz * Wz);
        Wh := sqrt(sqrWh);
        sqrAh := (sqrWh + Py * Py);
        Ah := sqrt(sqrAh);
        if (Ah >= (Au + Af)) then
          begin
            ElbowAngle := 1800;
          end
        else
          begin
            ElbowAngle := Ang_arccos((Au * Au + Af * Af - sqrAh) / (2 * Au * Af));
          end;
        Beta1 := arctan(Py / Wh) * RadtoDeg;
        Beta2 := Ang_arcsin((Af * sin(ElbowAngle * DegtoRad)) / Ah);
        if Beta2 - Beta1 < minShoulder then
          begin
            { If the shoulder pitch has reached it's lower constraint then we want the elbow pitch to point the
        }
            { lower arm at the polhemus point. }
            gamma := Beta1 + minShoulder;        { gamma = angle of shoulder pitch to polhemus point }
```

04/23/90 10:30 TrigDMs.pas Page 5

```
        c := sqrt(Au * Au + Ah * Ah - 2 * Au * Ah * cos(gamma * DegtoRad));        { c = side opposite
      gamma }
        newElbow := Ang_arcsin((Ah * sin(gamma * DegtoRad)) / c);
        ElbowAngle := 1800 - newElbow
      end;
    with dm.PointsOut[0] do
      begin
        LastValue.i := round(ElbowAngle);
        if ptrto <> nil then
          SetSixth(ptrto, ord(SixAxis), LastValue.i);
      end;
    with dm.PointsOut[1} do
      begin
        LastValue.i := round(Beta1);
        if ptrto <> nil then
          SetSixth(ptrto, ord(SixAxis), LastValue.i);
      end;
    with dm.PointsOut[2] do
      begin
        LastValue.i := round(Beta2);
        if ptrto <> nil then
          SetSixth(ptrto, ord(SixAxis), LastValue.i);
      end;
   end;
end;


procedure doAngleBetweenPoints;
{ This procedure returns the angle between two points   }
{ it takes as inputs:}
{   1. point 1 x }
{   2. point 1 y }
{   3. point 2 x }
{   4. point 2 y }
{ note that these angles must be in the same coordinate system, either global or at}
{ the same level of the tree.}
  var
    deltaX, deltaY: real;
    angle: integer;
    value1, hype: real;
begin
  with dm do
    begin
      deltaX := SlotsIn[0].ptrfrm^.i - SlotsIn[2].ptrfrm^.i;
      deltaY := SlotsIn[1].ptrfrm^.i - SlotsIn[3].ptrfrm^.i;

      hype := sqrt((deltaX * deltaX) + (deltaY * deltaY));
      angle := Ang_arcsin(deltaY / hype);

      if deltaX < 0 then
        angle := 1800 - angle;
      if angle < 0 then
```

```
        angle := angle + 3600;

      with dm, dm.PointsOut[0] do
        begin

          LastValue.i := angle;
          if ptrto <> nil then
            SetSixth(ptrto, ord(SixAxis), LastValue.i);
        end;
    end;
  end;


end.
```

```
unit waveformDMs;
interface

  uses
   chuckstuff, scottsStuff, AutoLib, FastStuff, Globals, Tree3DGlob, MiscRoutines, formTree3D, Tree3D,
      DMTypes, DMGlobals;

  procedure doSawTooth (var dm: DMRec);


  procedure HandleWaveforms (v: DMVerb; var dm: DMRec);

implementation

  const
   waveCalID = 2016;
   userBoxItem = 5;
   xItem = 8;
   yItem = 9;
   maxItem = 14;
   minItem = 13;
   freqItem = 15;


  type
   waveCalibPtr = ^waveCalib;
   waveCalib = record
      minY, maxY: integer;
      stepUp, stepDown: real;
      upDir: Boolean;
      yVal: real;
      x, y: integer;
      freq: real;
      oldPoint: point;
    end;

   tempPtr = ^tempInfoRec;
   tempInfoRec = record
      height, width: integer;
      thisWave: waveCalibPtr;
      box: rect;
      heightUnits, widthUnits: real;
      lastDLOGitem: integer;
    end;

  var
   tempInfo: tempPtr;
   waveCalDLOG: dialogPtr;

  procedure doSawTooth;
   var
    thisWave: waveCalibPtr;
```

```
begin
  if (dm.privateWords[0] <> dm.slotsIn[0].ptrfrm^.i) then
    begin

      dm.privateWords[0] := dm.slotsIn[0].ptrfrm^.i;
      thisWave := waveCalibPtr(dm.private);

      if (thisWave^.Yval >= thisWave^.y) then
        thisWave^.upDir := false
      else if (thisWave^.Yval <= thisWave^.minY) then
        thisWave^.upDir := true;

      if thisWave^.upDir then
        thisWave^.Yval := thisWave^.Yval + (thisWave^.stepUp * thisWave^.freq)
      else
        thisWave^.Yval := thisWave^.Yval - (thisWave^.stepDown * thisWave^.freq);

      if thisWave^.Yval >= thisWave^.y then
        thisWave^.yVal := thisWave^.y;
      if thisWave^.Yval <= thisWave^.minY then
        thisWave^.yVal := thisWave^.minY;

      with dm.PointsOut[0] do
        begin
          LastValue.i := round(thisWave^.Yval);
          if ptrto <> nil then
            SetSixth(ptrto, ord(SixAxis), LastValue.i);
        end;
    end;
end;


procedure wave (box: rect; toWhere: point);
begin
  MoveTo(box.left, box.bottom - 1);
  LineTo(toWhere.h, toWhere.v);
  LineTo(box.Right - 1, box.bottom - 1);
end;

procedure calcUnits;
begin
  with tempInfo^ do
    begin
      heightUnits := (thisWave^.maxY - thisWave^.minY) / height;
      widthUnits := (100 / (width));
    end;
end;

procedure changeXY (q, r: integer);
begin
  NumToEditText(waveCalDLOG, xItem, q);
  NumToEditText(waveCalDLOG, yItem, r);
end;
```

```
procedure scaleUnits (a, b: integer; var q, r: integer);
begin
  with tempInfo^ do
    begin
      q := 101 - round((box.right - a) * widthUnits);
      r := thisWave^.minY + round((box.bottom - b) * heightUnits);
    end;
end;

procedure drawWave (waveCalDLOG: dialogPtr; box: rect);
  var
    mouse: point;
    q, r: integer;
begin

  while (button) do
    with tempInfo^ do
      begin
        PenMode(patxOr);
        getMouse(mouse);

{constrains the new point to be within the bounding box}
        if mouse.h >= (box.right - 1) then
          mouse.h := box.right - 1;
        if mouse.h <= box.left then
          mouse.h := box.left;
        if mouse.v >= (box.bottom - 1) then
          mouse.v := box.bottom - 1;
        if mouse.v <= box.top then
          mouse.v := box.top;

        if (thisWave^.oldPoint.h <> mouse.h) or (thisWave^.oldPoint.v <> mouse.v) then
          begin

            wave(box, thisWave^.oldPoint);

            wave(box, mouse);
            PenNormal;

            calcUnits;
            scaleUnits(mouse.h, mouse.v, q, r);
            changeXY(q, r);

            thisWave^.oldPoint := mouse;
            frameRect(box);
          end;
        PenNormal;
      end;
  end;

  procedure fillWaveCalib (waveCalDLOG: dialogPtr; thisWave: waveCalibPtr);
```

```
begin
  thisWave^.maxY := getNumFromEditText(waveCalDLOG, maxItem);
  thisWave^.minY := getNumFromEditText(waveCalDLOG, minItem);
  thisWave^.freq := getRealFromEditText(waveCalDLOG, freqItem);
  thisWave^.x := getNumFromEditText(waveCalDLOG, xItem);
  thisWave^.y := getNumFromEditText(waveCalDLOG, yItem);
end;

procedure UserSetup (var dm: DMRec);
  var
    calibs: waveCalibPtr;

    itemHit: integer;
    item: handle;
    itemType: integer;

    startPt: point;
    oldPort: grafPtr;
  var
    newPoint: Point;
 begin

{get the dialog and set up the ports correctly}
    getPort(oldPort);
    waveCalDLOG := GetNewDialog(waveCalID, nil, pointer(-1));
    setPort(waveCalDLOG);
    PositionWindow(waveCalDLOG, 50, 30);
    calibs := waveCalibPtr(dm.private);

    tempInfo := tempPtr(NewPtr(sizeof(tempInfoRec)));
    tempInfo^.thisWave := calibs;

{ initialize values for the dialog box }
    NumToEditText(waveCalDLOG, maxItem, calibs^.maxY);    {integer}
    NumToEditText(waveCalDLOG, minItem, calibs^.minY);    {integer}
    GetDItem(waveCalDLOG, freqItem, itemType, item, tempInfo^.box);  {real}
    SetIText(item, stringof(calibs^.freq : 3 : 2));

    calcUnits;

    with tempInfo^ do
      begin
        GetDItem(waveCalDLOG, userBoxItem, itemType, item, box);
        height := box.bottom - box.top;
        width := box.right - box.left;
        FrameRect(box);

        showWindow(waveCalDLOG);
        paramText(dm.Name, stringof(thisWave^.x), stringof(thisWave^.y), '');

        PenMode(patxOr);
        wave(box, thisWave^.oldPoint);
        PenNormal;
```

```
    end;

  repeat
    FrameRect(tempInfo^.box);
    modalDialog(nil, itemHit);

    case itemHit of
      userBoxItem:
        begin
          getMouse(newPoint);
          if (PtInRect(newPoint, tempInfo^.box)) then
            drawWave(waveCalDLOG, tempInfo^.box);
        end;
      maxItem:
        begin
          calibs^.maxY := getNumFromEditText(waveCalDLOG, maxItem);
        end;
      minItem:
        begin
          calibs^.minY := getNumFromEditText(waveCalDLOG, minItem);
        end;
      freqItem:
        begin
          calibs^.freq := getRealFromEditText(waveCalDLOG, freqItem);
        end;
    end;
    with tempInfo^ do
      if (itemHit <> lastDLOGitem) and (lastDLOGitem > (minItem - 1)) and (lastDLOGitem < (freqItem +
      1)) then
        begin
          fillWaveCalib(waveCalDLOG, calibs);
          calcUnits;
          scaleUnits(thisWave^.oldPoint.h, thisWave^.oldPoint.v, newPoint.h, newPoint.v);
          changeXY(newPoint.h, newPoint.v);
        end;
    tempInfo^.lastDLOGitem := itemHit;
  until itemHit < 3;


  with TempInfo^ do
    begin

{get the values from the dialog and set the stored info }
      if itemHit = 1 then
        begin
          fillWaveCalib(waveCalDLOG, calibs);
          heightUnits := (calibs^.maxY - calibs^.minY) / height;
          widthUnits := (height / width) * heightUnits;
          calibs^.yVal := calibs^.minY;
          calibs^.upDir := true;

          if (calibs^.x = 0) then
            calibs^.stepUp := calibs^.y
```

```
          else
            calibs^.stepUp := calibs^.y / calibs^.x;

          if (calibs^.x = 0) then
            calibs^.stepDown := calibs^.y / 100
          else
            calibs^.stepDown := calibs^.y / (100 - calibs^.x);

{calibs^.stepUp := (calibs^.y / calibs^.x);}
{calibs^.stepDown := (calibs^.y / ((box.right - box.left) - (calibs^.x / widthUnits)));}
{     calibs^.stepDown := (((widthUnits * (box.right - box.left)) / calibs^.x) * 100);}
        end;

{closing and restoring windows}

      disposDialog(waveCalDLOG);
      disposPtr(ptr(tempInfo));
      tempinfo := nil;              {just to be certain}
      setPort(oldPort);
    end;
  end;


  procedure HandleWaveforms; { (v : DMVerb; var dm : DMRec) }
    var
      i: integer;
      h: Handle;
      theCalibs: waveCalibPtr;

  begin
    case v of
      initDM:               { Called once the first time this DM is started. }
        begin
          if dm.private <> nil then
            doClose(dm);
          h := NewHandle(sizeof(waveCalib));
          if h <> nil then
            begin
              MoveHHi(h);
              HLock(h);
              dm.private := h^;
              theCalibs := waveCalibPtr(dm.private);
              with theCalibs^ do
                begin
                  minY := 0;
                  maxY := 100;
                  freq := 1.0;
                  x := 50;
                  y := 57;
                  oldPoint.h := 102;
                  oldPoint.v := 129;
                  calcUnits;
```

```
          end;

         UserSetup(dm);

        end
       else
        begin
         Announce('Not enough memory to open this WaveForm DM');
         dm.state := usrOff;
        end;
      end;
    massageDM:        { Called once through the main loop. do a massage }
      begin
      end;
    calibDM:
      UserSetup(dm);
    calibPartDM:
      begin
        theCalibs := waveCalibPtr(dm.private);
        theCalibs^.yVal := theCalibs^.minY;
        theCalibs^.upDir := true;
      end;
    reHookedDM:
      ;
    fopenDM:
      tempInfo := nil;     { This DM has just been read from a file. If it's state is }
                          { on it was hooked up properly. }
    otherwise
      GenericHandle(v, dm);
   end;      { case }
 end;        { HandleHitTest }


end.
```

RB2 Isaac

5/30/90

Source Code Listing

© 1990 VPL Research, Inc.

TOWNSEND and TOWNSEND
JARON LANIER, et al.
Atty Docket No. 10274-8
VIRTUAL REALITY NETWORK

APPENDIX 3

```
/*****************************************************************

   envision.c aka IdiotSav.c - SGI Idiot Savant program
    that renders Swivel files with motion driven by BodyElectric.

   © 1989 VPL Research, Inc.
    Chuck Blanchard 4/20/89

   purged of any hardware specific calls   Michael Teitel Dec 20,1989

*****************************************************************/

#include <stdio.h>
#include <gl.h>
#include <math.h>
#include <sys/time.h>
#include "envisionfiles.h"
#include "envision.h"
#include "sgi.h"

#define TRUE 1
#define FALSE 0

/* ISMAC defined if this is compiled on a Macintosh. */
#undef ISMAC

/******************************
   Global Data
******************************/

IsHeader     mainHeader;         /* File header for the first file read in. */
int                 Finished = FALSE;      /* Flag set when done */
int                 mouse = FALSE;                  /* Flag set when using mouse for pos */
int                 debug = FALSE;                  /* Flag set for debug mode */
int                 hardsync = FALSE;      /* Flag set for hardsync mode */
int                 softreply = TRUE;      /* Flag set for softreply mode */
int                 genlock = FALSE;       /* Flag set for genlock mode */
int                 level;                          /* Level of tree node */
long                framecount = 0;                 /* Frame counter */
int                 stats = FALSE;                  /* flag set for statitistics */
char        *myname;                       /* Name of program */

NodeInfoType   NodeInfo[MAX_NODES];   /* Array of pointers to node objects. */
int          topNodeIndex = -1;     /* Index of top entry in NodeInfo */
                          /* that is used. */

/* IdiotSav has just started.  Initialize whatever needs to be done. */
```

```
void  Initialize(void);
void  Initialize()
{
   if (!mouse) {
          InitEther();                     /* Init ethernet */
   }
    InitDrawing();                /* set up graphics environment */
}


/* CloseAll() - Called upon quit.  Free up the memory used by the tree. */

CloseAll()
{
   CloseDrawing();                /* clean up any drawing stuff */
   close(sock);                   /* Close socket */
}                                          /* CloseAll */


/*********************************************
   General tree walking algorithms
*********************************************/

/* Walk the tree, performing the action the first time you come to a node. */

PreFixWalk(n,  action)
IsObject    *n;
void  (*action)();
{
     if (!n) return;
      (*action)(n);
    level++;
     PreFixWalk(n->downtree,action);
      PreFixWalk(n->righttree,action);
     level--;
}

/* Walk the tree, performing the action the second time you come to a node. */
InFixWalk(n,  action)
IsObject    *n;
void  (*action)();
{
     if (!n) return;
      InFixWalk(n->downtree,action);
      (*action)(n);
       InFixWalk(n->righttree,action);
}
```

```
/* Walk the tree, performing the action the last time you come to a node. */
PostFixWalk(n, action)
IsObject    *n;
void  (*action)();
{
    if (!n) return;
    PostFixWalk(n->downtree,action);
    PostFixWalk(n->righttree,action);
    (*action)(n);
}

IsObject *
NameSearch(node, name)
IsObject *node;
char    *name;
{
    IsObject *ret;
    if(!node) return(NULL);
    if(!strcmp(node->objectname, name)) return(node);
    ret = NameSearch(node->downtree, name);
    if(ret) return(ret);
    return(NameSearch(node->righttree, name));
}

IsObject *
CaseNameSearch(node, name)
IsObject *node;
char    *name;
{
    IsObject *ret;
    if(!node) return(NULL);
    if(!strcasecmp(node->objectname, name)) return(node);
    ret = CaseNameSearch(node->downtree, name);
    if(ret) return(ret);
    return(CaseNameSearch(node->righttree, name));
}

void main(argc,argv)
int argc;
char *argv[];
{
    int i;
    FILE *fileptr;
    float framespersec, numsec;
    char filename[MAX_STRING];
    struct timeval tp1,tp2;
    struct timezone tz;
```

```
myname = argv[0];
*filename = '\0';
 printf("%s: ",myname);
printf(ISAAC_REL_VER);
printf(ISAAC_REL_DATE);
  printf("\n");

for (i = 1; i < argc; i++) {
        if (strcmp("mouse",argv[i]) == 0) mouse = TRUE;
        else if (strcmp("nomouse",argv[i]) == 0) mouse = FALSE;
        else if (strcmp("debug",argv[i]) == 0) debug = TRUE;
        else if (strcmp("nodebug",argv[i]) == 0) debug = FALSE;
        else if (strcmp("hardsync",argv[i]) == 0) hardsync = TRUE;
        else if (strcmp("nohardsync",argv[i]) == 0) hardsync = FALSE;
        else if (strcmp("softreply",argv[i]) == 0) softreply = TRUE;
        else if (strcmp("nosoftreply",argv[i]) == 0) softreply = FALSE;
        else if (strcmp("right",argv[i]) == 0) righteye = TRUE;
        else if (strcmp("left",argv[i]) == 0) righteye = FALSE;
        else if (strcmp("genlock",argv[i]) == 0) genlock = TRUE;
        else if (strcmp("nogenlockright",argv[i]) == 0) genlock = FALSE;
        else if (strcmp("stats",argv[i]) == 0) stats = TRUE;
        else if (strcmp("nostats",argv[i]) == 0) stats = FALSE;
        else if (strcmp("help",argv[i]) == 0) {
            printf("usage: %s <worldfile>\n", myname);
            printf("          [mouse]      [nomouse    (default)]\n");
            printf("          [debug]      [nodebug    (default)]\n");
            printf("          [hardsync]   [nohardsync (default)]\n");
            printf("          [nosoftreply] [softreply  (default)]\n");
            printf("          [left]       [right      (default)]\n");
            printf("          [genlock]    [nogenlock  (default)]\n");
            printf("          [stats]      [nostats    (default)]\n");
            exit(0);
        }
        else strcpy(filename, argv[i]);
}

 if (hardsync) softreply = FALSE;
 if (softreply) hardsync = FALSE;

  if (*filename == '\0') strcpy(filename, "default.isaac");
  if ((fileptr = fopen(filename, "r")) == NULL) {
   fprintf(stderr, "%s: %s not found\n", myname, filename);
   exit(1);
}
 InitWS();                          /* set up display window (machine dependant)*/
 ReadFile(fileptr);
 fclose(fileptr);
```

```
    if (debug) printf("debug on.\n");

    Initialize();

    gettimeofday(&tp1, &tz);

    while(!Finished) {
        if (stats & (framecount == 500)) {
            gettimeofday(&tp2, &tz);
            if ((numsec  = (float) ((tp2.tv_sec - tp1.tv_sec)+
                                (tp2.tv_usec - tp1.tv_usec)/1000000.0)) != 0.0) {
                framespersec = (float) framecount / numsec;
                printf("#frames: %ld, #sec: %f, Frames per second: %f\n",
                framecount, numsec, framespersec);
                gettimeofday(&tp1, &tz);
                framecount = 0;
            }
        }
        if (mouse) {
            DriveTree();
            DrawWorld();
            framecount++;
        }
        else CheckEther();
    }
    CloseAll();
    exit(0);
}
```

```
/*****************************************************************

   envision.h  - headerfile for envision.c
   © 1989 VPL Research, Inc.

*****************************************************************/

/* define the NodeInfo stuff */

typedef struct {
    IsObject *nodeptr;
    long    swivIndex;
} NodeInfoType;

/* Macro to specify the Root node pointer. */
#define ROOT_NODE    NodeInfo[0].nodeptr

#define    MAX_X                    645
#define    MAX_Y                    484
#define    UNITS_PER_IN             6.0       /* units per inch */
#define    EYE_UNITS_PER_IN  200.0    /* mac interoccular units per inch */

#define    DEFAULT_LINEWIDTH        2
#define    CALIB_LINEWIDTH          5

#define SCREENSEP   ((0.875)  *  UNITS_PER_IN)
#define SCREENWIDTH          (2.1  *  UNITS_PER_IN)
#define SCREENHEIGHT         (1.6  *  UNITS_PER_IN)
#define SCREENDIST  (1.1  *  UNITS_PER_IN)
#define INIT_IOD    (2.25  *  UNITS_PER_IN)

#define FARCLIP              10000
#define FARAWAY              1000
#define WORLDSCALE           0.5
#define LEFTMOUSE   103
#define RIGHTMOUSE  101
#define MIDDLEMOUSE          102
#define MOUSEX               266
#define MOUSEY               267
#define ZKEY                 20
#define XKEY                 21
#define CKEY                 28
#define TKEY                 25

/* attribute flags */
#define CULLBACK    0x01
#define TRIMESH              0x02
#define FCAP                 0x04
```

```
#define BCAP                0x08
#define   INVISOBJ_MASK     0x10
#define   INVISTREE_MASK    0x20
#define   VIS_BOUND_MASK    0x40
#define   NVIS_BOUND_MASK 0x80
#define ANY_BOUND_MASK  0xC0

/* display modes */
#define   WIRE              2
#define   FILLED_WIRE       3
#define   FLAT_and_WIRE     4
#define   FLATSH            5
#define   SMOOTH            6

#define noErr          0

extern IsHeader mainHeader;       /* File header for the first file read in */
extern int Finished;          /* flag set when time to quit */
extern int mouse;                  /* flag set when using mouse for position */
extern IsObject *JamWorldPtr;
extern int debug;                 /* flag set when debug is enabled */
extern int softreply;             /* flag set when softreply is enabled */
extern int hardsync;              /* flag set when hardsync enabled */
extern int genlock;               /* flag set when genlock enabled */
extern int sock;              /* socket identifier */
extern long worldwin;                        /* world window identifier */
extern short righteye;                       /* right eye flag */
extern float Occular;              /* eye offset from center line */
extern int errno;                  /* error number */
extern char *myname;                         /* name of program */
extern int level;                  /* level of tree */
extern long framecount;                      /* frame counter */
extern int topNodeIndex;        /* Index of top entry in NodeInfo */

typedef struct {
          short             len;
          short             opcode;
          short             whoBit;
} headerStruct;
```

```
/***********************************************************************

   EnvisionDraw.c renders swivel objects with the tree walker in envision.c
   © Young Harvill, 1989 VPL Research, Inc.
     4/27/89
    RJW 1/11/90 Cleaned up.

***********************************************************************/

#include <stdio.h>
#include <gl.h>
#include <math.h>
#include "envisionfiles.h"
#include "envision.h"
#include "globals.h"

/*******************************
   initialize
********************************/

/* bind the lighting */
setlightmodel ()
{
    lmdef(DEFLMODEL, 1, 0, NULL);
    lmbind(LMODEL, 1);                      /* default model */
}

setmaterials()
{
    lmdef(DEFMATERIAL, 2, 9, unimaterial);
    lmbind(MATERIAL, 2);        /* universal material   */
}

setlights ()
{
    lmdef(DEFLIGHT, 2, 10, warmtoplight);
    lmdef(DEFLIGHT, 3, 10, coolunderlight);
    lmbind(LIGHT1, 2);                      /* bind the lights to this matrix */
    lmbind(LIGHT2, 3);
}

/* set the lightlist from header */
setlightlist  (hp)
lsHeader    *hp;
{
   long          j;

    for (j = 0; j < LIGHTSNUM; j++) {
```

```
        LightList[j].LightFlags = hp->IsLights[j].LightFlags;
        if (LightList[j].LightFlags == 1) {
            LightList[j].LightPrefs[0] = LCOLOR;
             LightList[j].LightPrefs[1] =
                    hp->IsLights[j].LightPrefs[1];
             LightList[j].LightPrefs[2] =
                    hp->IsLights[j].LightPrefs[2];
             LightList[j].LightPrefs[3] =
                    hp->IsLights[j].LightPrefs[3];  /* set the color */
            LightList[j].LightPrefs[4] = POSITION;
             LightList[j].LightPrefs[5] =
                    hp->IsLights[j].LightPrefs[5];
             LightList[j].LightPrefs[6] =
                    hp->IsLights[j].LightPrefs[6];
             LightList[j].LightPrefs[7] =
                    -1.0  *  (hp->IsLights[j].LightPrefs[7]);
             LightList[j].LightPrefs[8] = 0;           /* set the position */
             LightList[j].LightPrefs[9] = LMNULL;

            /* define the light */
             lmdef(DEFLIGHT, j + 2, 10, (LightList[j].LightPrefs));
             lmbind((short) (LIGHT2 + j), (short) (j + 2));
            /* bind the light */
        }
        if (debug) {

             printf("LightType: %ld,\n",
                       hp->IsLights[j].LightFlags);

             printf("LightVector: %f, %f, %f \n",
                       hp->IsLights[j].LightPrefs[5],
                       hp->IsLights[j].LightPrefs[6],
                       hp->IsLights[j].LightPrefs[7]);

             printf("LightRGB: %f, %f, %f \n",
                       hp->IsLights[j].LightPrefs[1],
                       hp->IsLights[j].LightPrefs[2],
                       hp->IsLights[j].LightPrefs[3]);
        }                               /* if light is active      */
   }                                    /* for LIGHTNUM times           */
}                                       /*  setlightlist                         */


bindlightlist ()
{
   long        j;
   for (j = 0; j < LIGHTSNUM; j++) {
          if (LightList[j].LightFlags > 0) {
```

```
            /* define the light */
            lmdef(DEFLIGHT, j + 2, 10, LightList[j].LightPrefs);
             lmbind((short) (LIGHT2 + j), (short) (j + 2));
        }                                   /* if light is active     */
  }                                         /* for LIGHTNUM times            */
}


setmateriallist (hp) /* set the materiallist from header */
lsHeader   *hp;
{
  long j;

   for (j = 0; j < MATNUM; j++) {
        MaterialList[j].MatFlags = hp->lsMaterials[j].MatFlags;
        if (MaterialList[j].MatFlags = 1) {
            MaterialList[j].MatPrefs[0] = DIFFUSE;
             MaterialList[j].MatPrefs[1] =
                  hp->lsMaterials[j].MatPrefs[1];
             MaterialList[j].MatPrefs[2] =
                  hp->lsMaterials[j].MatPrefs[2];
             MaterialList[j].MatPrefs[3] =
                  hp->lsMaterials[j].MatPrefs[3];
            MaterialList[j].MatPrefs[4] = SPECULAR;
             MaterialList[j].MatPrefs[5] =
                  hp->lsMaterials[j].MatPrefs[5];
             MaterialList[j].MatPrefs[6] =
                  hp->lsMaterials[j].MatPrefs[6];
             MaterialList[j].MatPrefs[7] =
                  hp->lsMaterials[j].MatPrefs[7];
            MaterialList[j].MatPrefs[8] = SHININESS;
             MaterialList[j].MatPrefs[9] =
                  hp->lsMaterials[j].MatPrefs[9];
            MaterialList[j].MatPrefs[10] = LMNULL;
            lmdef(DEFMATERIAL, j + 3, 11, MaterialList[j].MatPrefs);
            lmbind(MATERIAL, (short) (j + 3));
        }
        if (debug) {
            printf("MatType: %ld,\n",
                      hp->lsMaterials[j].MatFlags);

            printf("MaterialDirectRGB: %f, %f, %f \n",
                      hp->lsMaterials[j].MatPrefs[1],
                      hp->lsMaterials[j].MatPrefs[2],
                      hp->lsMaterials[j].MatPrefs[3]);

            printf("MaterialSpecularRGB: %f, %f, %f \n",
                      hp->lsMaterials[j].MatPrefs[5],
```

```
                          hp->IsMaterials[j].MatPrefs[6],
                          hp->IsMaterials[j].MatPrefs[7]);

                printf("MatShiny: %f\n",
                          hp->IsMaterials[j].MatPrefs[9]);
          }                              /* if light is active     */
   }                                     /* for MATNUM times                  */
}

#ifdef UNUSED

/*******************************************************
   Visible Bounding
   These routines test for collision between the viewer's eyepoint
   and the bounding cube of all VisBoundObjects, then perform VisBoundop

*******************************************************/

/* VisBoundop is the operation that is performed when the viewpoint is within a
   VisBoundObject's cubebounds */

VisBoundOp(n)
IsObject    *n;
{
     n->objectcolor[0] = 1.0 - n->objectcolor[0];
     n->objectcolor[1] = 1.0 - n->objectcolor[1];
     n->objectcolor[2] = 1.0 - n->objectcolor[2];
}

/* VisBoundTest tests to see if an object is a VisBoundObject,
   and if the viewpoint falls within it's cubebounds, if these
   things are true, it calls VisBoundop */

VisBoundTest(n)
IsObject    *n;
{
    Matrix tempmat;
     translate(n->relpos.xpos, n->relpos.ypos, n->relpos.zpos);
     rot(n->relangles.ayaw, 'y');
     rot(n->relangles.apitch, 'x'); /* set obj attitude */
     rot(n->relangles.aroll, 'z');
     scale(n->relscale, n->relscale, n->relscale); /* scale to obj space */
     getmatrix(tempmat);
    if ((n->objectrender & VIS_BOUND_MASK) &&
           (n->relcube.cubexmin < tempmat[3][0]) && /* test world 0,0,0, */
           (n->relcube.cubexmax > tempmat[3][0]) && /* with bounds */
           (n->relcube.cubeymin < tempmat[3][1]) &&
           (n->relcube.cubeymax > tempmat[3][1]) &&
```

```
    p3[1] = n->relcube.cubeymin;
    p3[2] = n->relcube.cubezmin;

#if 0
    bgnpolygon();
     n3f(bottom_normal);
     v3f(p0);
     n3f(bottom_normal);
     v3f(p1);
     n3f(bottom_normal);
     v3f(p2);
     n3f(bottom_normal);
     v3f(p3);
    endpolygon();
#endif

     polymat[0][0] = p0[0];
     polymat[0][1] = p0[1];
     polymat[0][2] = p0[2];

     polymat[1][0] = p1[0];
     polymat[1][1] = p1[1];
     polymat[1][2] = p1[2];

     polymat[2][0] = p2[0];
     polymat[2][1] = p2[1];
     polymat[2][2] = p2[2];

     polymat[3][0] = p3[0];
     polymat[3][1] = p3[1];
     polymat[3][2] = p3[2];

     poly(4, polymat);

     /* draw the front */
     p0[0] = n->relcube.cubexmin;
     p0[1] = n->relcube.cubeymin;
     p0[2] = n->relcube.cubezmin;

     p1[0] = n->relcube.cubexmin;
     p1[1] = n->relcube.cubeymax;
     p1[2] = n->relcube.cubezmin;

     p2[0] = n->relcube.cubexmax;
     p2[1] = n->relcube.cubeymax;
     p2[2] = n->relcube.cubezmin;

     p3[0] = n->relcube.cubexmax;
```

```
    p3[1] = n->relcube.cubeymin;
    p3[2] = n->relcube.cubezmin;

#if 0
    bgnpolygon();
     n3f(front_normal);
    v3f(p0);
     n3f(front_normal);
    v3f(p1);
     n3f(front_normal);
    v3f(p2);
     n3f(front_normal);
    v3f(p3);
    endpolygon();
#endif

     polymat[0][0] = p0[0];
     polymat[0][1] = p0[1];
     polymat[0][2] = p0[2];

     polymat[1][0] = p1[0];
     polymat[1][1] = p1[1];
     polymat[1][2] = p1[2];

     polymat[2][0] = p2[0];
     polymat[2][1] = p2[1];
     polymat[2][2] = p2[2];

     polymat[3][0] = p3[0];
     polymat[3][1] = p3[1];
     polymat[3][2] = p3[2];

     poly(4, polymat);

    /* draw the back */
     p0[0] = n->relcube.cubexmin;
     p0[1] = n->relcube.cubeymin;
     p0[2] = n->relcube.cubezmax;

     p1[0] = n->relcube.cubexmin;
     p1[1] = n->relcube.cubeymax;
     p1[2] = n->relcube.cubezmax;

     p2[0] = n->relcube.cubexmax;
     p2[1] = n->relcube.cubeymax;
     p2[2] = n->relcube.cubezmax;

     p3[0] = n->relcube.cubexmax;
```

```
        (n->relcube.cubezmin < tempmat[3][2]) &&
        (n->relcube.cubezmax > tempmat[3][2]))
        VisBoundOp(n);
}

/* VisBoundWalk walks the tree performing VisBoundop as needed */

VisBoundWalk(n)
IsObject    *n;
{
   if (!n)
        return;                          /* return if at the end */
    pushmatrix();
   VisBoundTest(n);              /* do the bounding test */
    VisBoundWalk(n->downtree);  /* traverse children with this matrix */
    popmatrix();
    VisBoundWalk(n->righttree); /* now traverse the siblings */
}


/*******************************************************
   Object drawing
   These routines support drawing cubic bounds,
   drawing triangular mesh objects and
   drawing complex poly caps on triangular mesh objects
   in various drawing modes

*******************************************************/

drawcube(n)
IsObject    *n;
{
    c3f(whitecolor);

   /* draw the top */
    p0[0] = n->relcube.cubexmin;
    p0[1] = n->relcube.cubeymax;
    p0[2] = n->relcube.cubezmin;

    p1[0] = n->relcube.cubexmin;
    p1[1] = n->relcube.cubeymax;
    p1[2] = n->relcube.cubezmax;

    p2[0] = n->relcube.cubexmax;
    p2[1] = n->relcube.cubeymax;
    p2[2] = n->relcube.cubezmax;

    p3[0] = n->relcube.cubexmax;
```

```
    p3[1] = n->relcube.cubeymax;
    p3[2] = n->relcube.cubezmin;

#if 0
    bgnpolygon();
     n3f(top_normal);
     v3f(p0);
     n3f(top_normal);
     v3f(p1);
     n3f(top_normal);
     v3f(p2);
     n3f(top_normal);
     v3f(p3);
    endpolygon();
#endif

      polymat[0][0] = p0[0];
      polymat[0][1] = p0[1];
      polymat[0][2] = p0[2];

      polymat[1][0] = p1[0];
      polymat[1][1] = p1[1];
      polymat[1][2] = p1[2];

      polymat[2][0] = p2[0];
      polymat[2][1] = p2[1];
      polymat[2][2] = p2[2];

      polymat[3][0] = p3[0];
      polymat[3][1] = p3[1];
      polymat[3][2] = p3[2];

      poly(4, polymat);

      /* draw the bottom */
      p0[0] = n->relcube.cubexmin;
      p0[1] = n->relcube.cubeymin;
      p0[2] = n->relcube.cubezmin;

      p1[0] = n->relcube.cubexmin;
      p1[1] = n->relcube.cubeymin;
      p1[2] = n->relcube.cubezmax;

      p2[0] = n->relcube.cubexmax;
      p2[1] = n->relcube.cubeymin;
      p2[2] = n->relcube.cubezmax;

      p3[0] = n->relcube.cubexmax;
```

```
    p3[1] = n->relcube.cubeymin;
    p3[2] = n->relcube.cubezmax;

#if 0
    bgnpolygon();
     n3f(back_normal);
     v3f(p0);
     n3f(back_normal);
     v3f(p1);
     n3f(back_normal);
     v3f(p2);
     n3f(back_normal);
     v3f(p3);
    endpolygon();
#endif

     polymat[0][0] = p0[0];
     polymat[0][1] = p0[1];
     polymat[0][2] = p0[2];

     polymat[1][0] = p1[0];
     polymat[1][1] = p1[1];
     polymat[1][2] = p1[2];

     polymat[2][0] = p2[0];
     polymat[2][1] = p2[1];
     polymat[2][2] = p2[2];

     polymat[3][0] = p3[0];
     polymat[3][1] = p3[1];
     polymat[3][2] = p3[2];

     poly(4, polymat);

     /* draw the right */
     p0[0] = n->relcube.cubexmin;
     p0[1] = n->relcube.cubeymin;
     p0[2] = n->relcube.cubezmin;

     p1[0] = n->relcube.cubexmin;
     p1[1] = n->relcube.cubeymax;
     p1[2] = n->relcube.cubezmin;

     p2[0] = n->relcube.cubexmin;
     p2[1] = n->relcube.cubeymax;
     p2[2] = n->relcube.cubezmax;

     p3[0] = n->relcube.cubexmin;
```

```
    p3[1] = n->relcube.cubeymin;
    p3[2] = n->relcube.cubezmax;

#if 0
    bgnpolygon();
     n3f(right_normal);
    v3f(p0);
     n3f(right_normal);
    v3f(p1);
     n3f(right_normal);
    v3f(p2);
     n3f(right_normal);
    v3f(p3);
    endpolygon();
#endif

     polymat[0][0] = p0[0];
     polymat[0][1] = p0[1];
     polymat[0][2] = p0[2];

     polymat[1][0] = p1[0];
     polymat[1][1] = p1[1];
    .polymat[1][2] = p1[2];

     polymat[2][0] = p2[0];
     polymat[2][1] = p2[1];
     polymat[2][2] = p2[2];

     polymat[3][0] = p3[0];
     polymat[3][1] = p3[1];
     polymat[3][2] = p3[2];

     poly(4, polymat);

     /* draw the left */
     p0[0] = n->relcube.cubexmax;
     p0[1] = n->relcube.cubeymin;
     p0[2] = n->relcube.cubezmin;

     p1[0] = n->relcube.cubexmax;
     p1[1] = n->relcube.cubeymax;
     p1[2] = n->relcube.cubezmin;

     p2[0] = n->relcube.cubexmax;
     p2[1] = n->relcube.cubeymax;
     p2[2] = n->relcube.cubezmax;

     p3[0] = n->relcube.cubexmax;
```

```
    p3[1] = n->relcube.cubeymin;
    p3[2] = n->relcube.cubezmax;

#if 0
    bgnpolygon();
     n3f(left_normal);
     v3f(p0);
     n3f(left_normal);
     v3f(p1);
     n3f(left_normal);
     v3f(p2);
     n3f(left_normal);
     v3f(p3);
    endpolygon();
#endif

      polymat[0][0] = p0[0];
      polymat[0][1] = p0[1];
      polymat[0][2] = p0[2];

      polymat[1][0] = p1[0];
      polymat[1][1] = p1[1];
      polymat[1][2] = p1[2];

      polymat[2][0] = p2[0];
      polymat[2][1] = p2[1];
      polymat[2][2] = p2[2];

      polymat[3][0] = p3[0];
      polymat[3][1] = p3[1];
      polymat[3][2] = p3[2];
     poly(4, polymat);
}                                          /* end of cube drawing */

#endif /* UNUSED */

drawflat(n, i)
IsObject *n;
long    i;
{
    long j;
    long col ;
     long i_p_1_t_col, i_t_col ;
    long a, b, c, d;
      float *first, *second, *third, *fourth;
     float *normal;

    col = n->objectmesh.columns;
```

```
 i_t_col     = i * col;
  i_p_1_t_col = (i + 1) * col;

  for ( j = 0; j <(col-1); j++) {
   /* draw a flat shaded poly in the mesh */
        a = i_t_col + j;
        b = a + 1;
        c = i_p_1_t_col + j;
        d = c + 1;

   bgnpolygon() ;

        normal = n->objectmesh .meshverts[a].planenormal;
    n3f (normal);
        v3f (first = n->objectmesh .meshverts[a].meshpoint);

        second = n->objectmesh .meshverts[c].meshpoint;
        n3f  (normal);
        v3f (second);

        third = n->objectmesh .meshverts[d].meshpoint;
        if  ((second[0]!=third[0])  ||  (second[1]!=third[1])
            ||  (second[2]!=third[2])) {
             n3f (normal);
       v3f (third);
        }

        fourth = n->objectmesh .meshverts[b].meshpoint;
        if  ((first[0]  !=  fourth[0])  ||  (first[1]  !=  fourth[1])
            ||  (first[2]  !=  fourth[2])) {
             n3f (normal);
       v3f (fourth);
        }

        endpolygon() ;
  }
}


drawsmooth(n,  i)
IsObject  *n;
long    i;
{
   long  j;
   long col;
     long  i_t_col,  i_p_1_t_col;
   long a, b;
```

```
    col = n->objectmesh.columns;
    i_t_col = i * col;
    i_p_1_t_col = (i + 1) * col;


    bgntmesh ();
    /* draw the first two points */
     n3f ( n->objectmesh .meshverts[i_t_col].meshnormal );
     v3f ( n->objectmesh .meshverts[i_t_col].meshpoint ) ;

     n3f ( n->objectmesh .meshverts[i_p_1_t_col].meshnormal );
     v3f ( n->objectmesh .meshverts[i_p_1_t_col].meshpoint ) ;

    /* loop through the rest of the mesh */
     for ( j = 0; j <(col-1); j++) {
            a = i_t_col + j + 1;
            b = i_p_1_t_col + j + 1;

        n3f ( n->objectmesh .meshverts[a].meshnormal );
        v3f ( n->objectmesh .meshverts[a].meshpoint ) ;

            /* two points at a time */
        n3f ( n->objectmesh .meshverts[b].meshnormal );
        v3f ( n->objectmesh .meshverts[b].meshpoint ) ;
    }
    endtmesh();     /* section loop   */
}

drawwire(n,  i)
IsObject *n;
long   i;
{
   long j ;
   long col ;
     long i_t_col, i_p_1_t_col;
   long a, b, c, d;

    col = n->objectmesh.columns;
    i_t_col = i * col;
    i_p_1_t_col = (i + 1) * col;

     c3f(wirecolor);

     for ( j = 0; j <(col-1); j++) {

            a = i_t_col + j;
            b = a + 1;
            c = i_p_1_t_col + j;
```

```
        d = c + 1;

    /* draw a wire poly in the mesh */
      polymat[0][0] = n->objectmesh.meshverts[a].meshpoint[0];
      polymat[0][1] = n->objectmesh.meshverts[a].meshpoint[1];
      polymat[0][2] = n->objectmesh.meshverts[a].meshpoint[2];

      polymat[1][0] = n->objectmesh.meshverts[c].meshpoint[0];
      polymat[1][1] = n->objectmesh.meshverts[c].meshpoint[1];
      polymat[1][2] = n->objectmesh.meshverts[c].meshpoint[2];

      polymat[2][0] = n->objectmesh.meshverts[d].meshpoint[0];
      polymat[2][1] = n->objectmesh.meshverts[d].meshpoint[1];
      polymat[2][2] = n->objectmesh.meshverts[d].meshpoint[2];

      polymat[3][0] = n->objectmesh.meshverts[b].meshpoint[0];
      polymat[3][1] = n->objectmesh.meshverts[b].meshpoint[1];
      polymat[3][2] = n->objectmesh.meshverts[b].meshpoint[2];

     poly(4,polymat);
  }
}


/* setcolor  sets the color for this object based on the display type */

setobjcolor  (n)
IsObject    *n;
{
    switch (n->objectrenderstyle) {
  case FLATSH:
          unimaterial[1]  =  n->objectcolor[0];        /* set object material
                                                                  * color */

          unimaterial[2]  =  n->objectcolor[1];
          unimaterial[3]  =  n->objectcolor[2];
          unimaterial[5]  =  0;
          unimaterial[6]  =  0;
          unimaterial[7]  =  0;
          break;
  case WIRE:
          wirecolor  =  n->objectcolor;
          break;
  case FILLED_WIRE:
          unimaterial[9]  =  1.0;
          unimaterial[10]  =  1.0;
          unimaterial[11]  =  1.0;
          unimaterial[5]  =  1.0;
          unimaterial[6]  =  1.0;
```

```
        unimaterial[7] = 1.0;
        wirecolor = blackcolor;
        break;
  case FLAT_and_WIRE:
        unimaterial[1] = n->objectcolor[0];      /* set object material
                                                  * color */
        unimaterial[2] = n->objectcolor[1];
        unimaterial[3] = n->objectcolor[2];
        unimaterial[5] = 0;
        unimaterial[6] = 0;
        unimaterial[7] = 0;
        wcolor[0] = n->objectcolor[0] / 3.0;     /* scale color */
        wcolor[1] = n->objectcolor[1] / 3.0;
        wcolor[2] = n->objectcolor[2] / 3.0;
        wirecolor = wcolor;
        break;
  case SMOOTH:
        unimaterial[1] = n->objectcolor[0];
        unimaterial[2] = n->objectcolor[1];
        unimaterial[3] = n->objectcolor[2];
        unimaterial[5] = 0;
        unimaterial[6] = 0;
        unimaterial[7] = 0;
        break;
  }
}

/* drawsection draws one band of triangular polys in a polymesh */

drawsection (n, i)
IsObject    *n;
long  i;
{
    switch (n->objectrenderstyle) {
  case FLATSH:
        drawflat(n, i);
        break;
  case WIRE:
        drawwire(n, i);
        break;
  case FILLED_WIRE:
        drawflat(n, i);
        drawwire(n, i);
        break;
  case FLAT_and_WIRE:
        drawflat(n, i);
        drawwire(n, i);
        break;
```

```
  case SMOOTH:
          drawsmooth(n, i);
          break;
  }
} /* drawsection      */

drawflatfront  (n)
IsObject    *n;
{
   long        j;
   long        col;

   col = n->objectmesh.columns;

   concave(TRUE);                  /* may be a complex poly ... */
   bgnpolygon();
   for (j = 0; j < (col - 1); j++) {
          /* all points but last */
          n3f(n->objectmesh.meshverts[0].meshnormal);
          v3f(n->objectmesh.meshverts[col + j].meshpoint);
   }
   endpolygon();                   /* cap loop */
   concave(FALSE);                 /* restore simple poly drawing */
}                                          /* flatfrontcap */

drawwirefront(n)
IsObject    *n;
{
   long        a, j;
   long        col;

   col = n->objectmesh.columns;
     c3f(wirecolor);

   concave(TRUE);                  /* may be a complex poly ... */
    for (j = 0; j < (col - 1); j++) {          /* all points but last */
          a = col + j;
          polymat[j][0]  =  n->objectmesh.meshverts[a].meshpoint[0];
          polymat[j][1]  =  n->objectmesh.meshverts[a].meshpoint[1];
          polymat[j][2]  =  n->objectmesh.meshverts[a].meshpoint[2];
   }
    poly(j, polymat);
   concave(FALSE);                 /* restore simple poly drawing */
}                                          /* wirefrontcap */

drawflatback (n, i)
IsObject    *n;
long i;
```

```
{
   long        j;
   long        col;

   col = n->objectmesh.columns;

   concave(TRUE);                 /* may be a complex poly ... */
   bgnpolygon();
    for (j = (col - 2); j > (-1); j--) {      /* decrement for proper
                                                   * winding order */
         /* loop through dem points */
         n3f(n->objectmesh.meshverts[(i + 1) * col].meshnormal);
         v3f(n->objectmesh.meshverts[(i * col) + j].meshpoint);
   }
   endpolygon();                  /* cap loop */
   concave(FALSE);                /* restore simple poly drawing */
}                                               /* flatbackcap */

drawwireback (n, i)
IsObject   *n;
long i;
{
   long        a, j;
   long        col;

   col = n->objectmesh.columns;
    c3f(wirecolor);

   concave(TRUE);                 /* may be a complex poly ... */
    for (j = 0; j == (col - 2); j++) {
         /* loop through dem points */
         a = (i * col) + ((col - 2) - j);
         polymat[j][0] = n->objectmesh.meshverts[a].meshpoint[0];
         polymat[j][1] = n->objectmesh.meshverts[a].meshpoint[1];
         polymat[j][2] = n->objectmesh.meshverts[a].meshpoint[2];
         poly(j, polymat);
   }
   concave(FALSE);                /* restore simple poly drawing */
}                                               /* wirebackcap */

/* backcap draws a complex polygon on the backface of a polymesh */

backcap (n, i)
IsObject   *n;
long i;
{
    switch (n->objectrenderstyle) {
   case FLATSH:
```

```
            drawflatback(n,i);
            break;
    case WIRE:
            drawwireback(n,  i);
            break;
    case FILLED_WIRE:
            drawflatback(n,  i);
            drawwireback(n,  i);
            break;
    case FLAT_and_WIRE:
            drawflatback(n,  i);
            drawwireback(n,  i);
            break;
    case SMOOTH:
            drawflatback(n,  i);
            break;
  }
}

/* frontcap draws a complex polygon on the frontface of a polymesh */

frontcap  (n)
IsObject     *n;
{
     switch  (n->objectrenderstyle)  {
    case FLATSH:
            drawflatfront(n);
            break;
    case WIRE:
            drawwirefront(n);
            break;
    case FILLED_WIRE:
            drawflatfront(n);
            drawwirefront(n);
            break;
    case FLAT_and_WIRE:
            drawflatfront(n);
            drawwirefront(n);
            break;
    case SMOOTH:
            drawflatfront(n);
            break;
  }
}

/* drawmesh draws meshes and handles front and back caps being set */

drawmesh(n)
```

```
IsObject   *n;
{
  long        i;
  long        row;
   row = n->objectmesh.rows;

   if ((n->objectrender) & FCAP)          /* check and draw the front cap */
          frontcap(n);
  else
          drawsection(n, 0);   /* else use triangular section */

   if (row > 3) {
          for (i = 1; i < (row - 2); i++)  /* loop through mid sections ... */
              drawsection(n, i);
  }
   if (row > 2) {
          if ((n->objectrender) & BCAP)  /* draw backcap if there is one */
              backcap(n, row-2);
          else
              drawsection(n, row - 2);      /* else finish with triangular mesh */
  }
}                                       /* drawmesh */

/* DrawObject sets the coordinates space for an object and draws it */

DrawObject(n)
IsObject   *n;
{
    if ((n->objectversion == 2) ||
          (n->objectrenderstyle != SMOOTH)) {       /* test whether to use
                                                     * material list */
          setobjcolor(n);                /* set object's color */
          setmaterials();
  } else
          lmbind(MATERIAL, (short) ((n->materialindex) + 3));

   drawmesh(n);                 /* draw the mesh */
}

InverseMat(MyMat)
Matrix MyMat; /* assumes scale is 1.0 */
{
   Matrix        MatTemp;
    pushmatrix();
    loadmatrix(idmat);
    getmatrix(MatTemp);
     MatTemp[0][0] = MyMat[0][0];
     MatTemp[1][1] = MyMat[1][1];
```

```
    MatTemp[2][2] = MyMat[2][2];
    MatTemp[1][0] = MyMat[0][1];
    MatTemp[2][0] = MyMat[0][2];
    MatTemp[0][1] = MyMat[1][0];
    MatTemp[0][2] = MyMat[2][0];
    MatTemp[2][1] = MyMat[1][2];
    MatTemp[1][2] = MyMat[2][1];
    multmatrix(MatTemp);
      translate(-MyMat[3][0], -MyMat[3][1], -MyMat[3][2]);
    getmatrix(MyMat);
    popmatrix();
}

/* Walk the tree, drawing the objects that are visible */

DrawWalk(n)
IsObject *n;
{
    if (!n)
            return;

    if (!((n == JamWorldPtr) || (n->objectrender & INVISTREE_MASK))) {
            pushmatrix();
#if OLD_CODE
            /* translate to object space */
            translate(n->relpos.xpos, n->relpos.ypos, n->relpos.zpos);
            rot(n->relangles.ayaw, 'y');
            rot(n->relangles.apitch, 'x');     /* set object's attitude */
            rot(n->relangles.aroll, 'z');
            scale(n->relscale, n->relscale, n->relscale);          /* scale to object space */
#endif
            /* RJW replaced with pre-computed per-object matrix! */
            multmatrix(n->objmat);

            if (n->objectrender & ANY_BOUND_MASK) {
                Matrix tempmat;

                 getmatrix(tempmat);
                 InverseMat(tempmat);
                if (n->objectrender & VIS_BOUND_MASK) {
                        if (n->relcube.cubexmin < tempmat[3][0] &&          /* test world 0,0,0,
 */
                            n->relcube.cubexmax > tempmat[3][0] &&          /* with bounds */
                            n->relcube.cubeymin < tempmat[3][1] &&
                            n->relcube.cubeymax > tempmat[3][1] &&
                            n->relcube.cubezmin < tempmat[3][2] &&
                            n->relcube.cubezmax > tempmat[3][2]) {
                            if (!(n->objectrender & INVISOBJ_MASK))
```

```
                                DrawObject(n);        /* Visible */
                            DrawWalk(n->downtree);
                        }
                } else if (!(n->relcube.cubexmin < tempmat[3][0] &&          /* test world 0,0,0,
* /
                                n->relcube.cubexmax > tempmat[3][0] &&  /* with bounds */
                                n->relcube.cubeymin < tempmat[3][1] &&
                                n->relcube.cubeymax > tempmat[3][1] &&
                                n->relcube.cubezmin < tempmat[3][2] &&
                                n->relcube.cubezmax > tempmat[3][2])) {
                        if (!(n->objectrender & INVISOBJ_MASK))
                            DrawObject(n);    /* Visible */
                        DrawWalk(n->downtree);
                }
            } else {
                if (!(n->objectrender & INVISOBJ_MASK))
                        DrawObject(n);       /* Visible */
                DrawWalk(n->downtree);
            }
            popmatrix();
    }
      DrawWalk(n->righttree);
}

/* SetViewObj sets the current viewing object matrix */

SetViewObj(n)
IsObject    *n;
{
    while ((n != ROOT_NODE) && (n != 0)) {
            scale(1 / n->relscale,
                 1 / n->relscale,
                 1 / n->relscale);
            rot(-(n->relangles.aroll),  'z');
            rot(-(n->relangles.apitch),  'x');          /* in reverse order */
            rot(-(n->relangles.ayaw),  'y');
            translate(-(n->relpos.xpos),
                         -(n->relpos.ypos),
                         -(n->relpos.zpos));             /* negative position */
            n = n->uptree;
    }
    scale(1 / ROOT_NODE->relscale,
             1 / ROOT_NODE->relscale,
             1 / ROOT_NODE->relscale);
     rot(-(ROOT_NODE->relangles.aroll), 'z');
     rot(-(ROOT_NODE->relangles.apitch), 'x');            /* in reverse order */
     rot(-(ROOT_NODE->relangles.ayaw), 'y');
     translate(-(ROOT_NODE->relpos.xpos),
```

```
		-(ROOT_NODE->relpos.ypos),
		-(ROOT_NODE->relpos.zpos));		/* negative position */
}

/* DrawWorld is the thing that draws it all */

DrawWorld()
{
	c3f(ROOT_NODE->objectcolor);/* world object has background color */
	clear();
	zclear();
	pushmatrix();			/* root matrix of the world */
	SetViewObj(JamWorldPtr);

	if (righteye)
		translate((Occular * UNITS_PER_IN), 0, 0);
	else
		translate(-(Occular * UNITS_PER_IN), 0, 0);

	if (mainHeader.fileversion == 2)
		setlights();			/* bind lights here to stick to world */
	else if (mainHeader.fileversion == 3)
		bindlightlist();
	else
		printf("Unknown Fileversion %d\n", mainHeader.fileversion);

	DrawWalk(ROOT_NODE->downtree);
	popmatrix();

	if (mouse)
		swapbuffers();
}
```

```
/****************************
  envisiondrawportable.c                M. A. Teitel 12/27/89

  This file contains portable code from envisiondraw.c
  No functions in this file call any machine dependant librarys.
****************************/

#include <stdio.h>
#include <gl.h>
#include <math.h>
#include  "envisionfiles.h"
#include  "envision.h"
#include  "globals.h"

/* set up the lights and materials */
InitLights()
{
    setlightmodel();
    if (mainHeader.fileversion == 2) {
            setlights();
            printf("Initializing file version 2 lights \n");
    } else if (mainHeader.fileversion == 3) {
            setlightlist(&mainHeader);
            printf("Initializing file version 3 light \n");
            setmateriallist(&mainHeader);
            printf("Initializing file version 3 materials \n");
            setmaterials();
    } else {
            printf(" Unknown File version %d \n", mainHeader.fileversion);
            return  (-1);
    }
}

InitDrawing()
{
    JamWorldPtr = 0;
    InitLights();                       /* set up light */
    InitPerspective(); /* set up perspective */
}

typedef struct {
  headerStruct   head;
  short          occX, occY;
  short          right;
  char           name[40];
} *viewPointer;

View(buf)
```

```
short *buf;
{
    viewPointer     v;
    IsObject *nptr, *CaseNameSearch();

    v = (viewPointer) buf;

    /* RJW 1/24/90 make View case insensitive */
   nptr = CaseNameSearch(ROOT_NODE, v->name);

    if (nptr == NULL)
            printf("View: name '%s' not found\n", v->name);

    JamWorldPtr = nptr;

   Occular = v->occX / EYE_UNITS_PER_IN;
    righteye = v->right;
    if(debug) {
            printf("View:   name '%s'\n", v->name);
        printf("VIEW: righteye: %d, Occular: %f (inches)\n",
                        righteye, Occular);
   }
    UpdateWindow(righteye, Occular);
}
```

```
/*************************************************************

   envisiondrive.c  - drives the tree drawn by envisiondraw.c
   © Young Harvill, 1989 VPL Research, Inc.

*************************************************************/

#include <stdio.h>
#include <gl.h>
#include <math.h>
#include "envisionfiles.h"
#include "envision.h"

extern NodeInfoType   NodeInfo[];
extern  Matrix idmat;

Matrix inmat = {1.0, 0.0, 0.0, 0.0,              /* user input matrix */
                0.0, 1.0, 0.0, 0.0,
                0.0, 0.0, 1.0, 0.0,
                0.0, 0.0, 0.0, 1.0,
                };

/* globals to save input state */

long lastx = 0, lasty = 0 ;
float flastx = 0 , flasty = 0, flastz = 0 ;
float flastroll = 0 , flastpitch = 0, flastyaw = 0 ;

/*******************************************************
DriveTree
This routine adds delta changes to the world position based on mouse input.
Attitude changes are applied directly to the view point.
Positional changes are
tranformed into viewer attitude space and then applied to world position.
*******************************************************/

DriveTree()
{
    if (getbutton(10)) {           /* Q key */
          Finished = 1;
          return;
  }
  if (getbutton(LEFTMOUSE)) {
          if (getbutton(XKEY)) {          /* handles attitude input */
             /* mousey = pitch */
            ROOT_NODE->relangles.apitch =
                    flastpitch + ((float) (lasty - getvaluator(MOUSEY)));
```

```
        ROOT_NODE->relangles.ayaw =             /* mousex = yaw */
            flastyaw + ((float) (lastx - getvaluator(MOUSEX)));
    }
    if (getbutton(ZKEY)) {              /* handles x,z position input */
        pushmatrix();      /* save current matrix state */
        loadmatrix(idmat);              /* use identity matrix */
        /* set the matrix to viewer att */
        rot((ROOT_NODE->relangles.ayaw), 'y');
        rot((ROOT_NODE->relangles.apitch), 'x');
        rot((ROOT_NODE->relangles.aroll), 'z');
        /* translate by input */
         translate(-((float) (lastx - getvaluator(MOUSEX))),
                  0,
                    -((float) (lasty - getvaluator(MOUSEY))));
        getmatrix(inmat); /* fetch results to inmat */
        popmatrix();       /* restore the matrix state */
        /* set the input at viewer node */
        ROOT_NODE->relpos.zpos = flastz + inmat[3][2];
        ROOT_NODE->relpos.ypos = flasty + inmat[3][1];
        ROOT_NODE->relpos.xpos = flastx + inmat[3][0];
    }
    if (getbutton(CKEY)) {              /* handles x,y position input */
        pushmatrix();      /* save current matrix state */
        loadmatrix(idmat);              /* use identity matrix */
        /* set the matrix to viewer att */
        rot((ROOT_NODE->relangles.ayaw), 'y');
        rot((ROOT_NODE->relangles.apitch), 'x');
        rot((ROOT_NODE->relangles.aroll), 'z');
        /* translate by input */
         translate(-((float) (lastx - getvaluator(MOUSEX))),
                    -((float) (lasty - getvaluator(MOUSEY))),
                  0);
        getmatrix(inmat); /* fetch results to inmat */
        popmatrix();       /* restore the matrix state */
        /* set the input at viewer node */
        ROOT_NODE->relpos.zpos = flastz + inmat[3][2];
        ROOT_NODE->relpos.ypos = flasty + inmat[3][1];
        ROOT_NODE->relpos.xpos = flastx + inmat[3][0];
    }
} else {                            /* else no leftmouse button ... */
    lastx = getvaluator(MOUSEX);    /* save the current mouse state */
    lasty = getvaluator(MOUSEY);
    /* save world orientation for delta change */
    flastz = ROOT_NODE->relpos.zpos;
    flastx = ROOT_NODE->relpos.xpos;
    flasty = ROOT_NODE->relpos.ypos;
    flastroll = ROOT_NODE->relangles.aroll;
    flastpitch = ROOT_NODE->relangles.apitch;
```

```
            flastyaw = ROOT_NODE->relangles.ayaw;
    }
}

/*  DriveTree  */
```

```
/* header and object description for Swiv to IS files */
/* 11/30/89 Young Harvill, VPL Research */
/* header is variable length, offset is determined by the version of the header size*/
/* version 3 has a list of materials and lights for use in rendering the object */
/* objects in version 3 have the sgiobject field changed to an objectmaterial field */
/* the object material is an index into the array of materials defined in the header */
/* there is also a MINFILEVERSION definition to specify a range of compatible files */

#define ISAAC_REL_VER     " 1.2 "
#define ISAAC_REL_DATE    " 01/24/90 "

#define FILEVERSION         3
#define MINFILEVERSION      2
#define MAX_FNAME_LEN   40
#define MAX_NODES       256
#define MAX_STRING          80
#define MATNUM                  24
#define LIGHTSNUM           8
#define FIXSCALE            0x10000

typedef struct {
        long  MatFlags ;
        float MatPrefs[11];
} SGIMaterial ;

typedef struct {
        long  LightFlags ;
        float LightPrefs[10];
} SGILight ;

typedef struct {
    long fileversion ;              /* now is 3 */
    long offset2data ;              /* in version three, no longer 256 */
    float xmeasure2screen ;     /* number of units per screen pixels */
    float xscreenres ;              /* number of pixels to the inch */
    float ymeasure2screen ;     /* number of units per screen pixels */
    float yscreenres ;              /* number of pixels to the inch */
    char isname[40] ;               /* name of the file */
        SGIMaterial IsMaterials[MATNUM];
        SGILight    IsLights[LIGHTSNUM];
    char isunused[100] ;            /* bunch of space, should be zeroed out */
} IsHeader ;


typedef struct {               /* bounded cube */
  float     cubexmax;
  float     cubexmin;
  float     cubeymax;
```

```
   float        cubeymin;
   float        cubezmax;
   float        cubezmin;
} cube;

typedef struct {                   /* 3d point */
   float        xpos;
   float        ypos;
   float        zpos;
} pos3;

typedef struct {                   /* Euler Angles */
   float        aroll;
   float        apitch;
   float        ayaw;
} angle3;

typedef struct {
   float        meshpoint[3];
   float        meshnormal[3];
   float        planenormal[3];
} vertex;

typedef struct {                   /* poly mesh */
   long         rows;
   long         columns;
   vertex       meshverts[100];
} polymesh;

#define OBJECTVERSION                   3
#define MINOBJECTVERSION        2

typedef struct ObjNode {           /* Runtime Object definition */
        struct ObjNode  *uptree ;          /* tree pointers */
     struct ObjNode  *downtree ;
     struct ObjNode  *righttree ;
     struct ObjNode  *lefttree ;

        Matrix     objmat;                       /* Cached object matrix */

     long   objectversion ;        /* version starts with 1  */
     long   objectsize  ;          /* size of record in bytes */
     long   objectindex ;          /* swivels index for this object */
     long   materialindex ;        /* Object's material ID */
     long   isaacPtrs[6] ;                 /* array of pointers to other records */
     cube   relcube ;              /* relative bounding cube */
     pos3   relpos ;               /* position relative to parent */
     angle3 relangles ;                    /* orientation relative to parent */
```

```
    float   relscale ;              /* scale relative to parent */
    cube  abscube;                  /* absolute cube*/
    pos3  abspos ;                  /* position relative to world */
    angle3 absangles ;                      /* orientation relative to world */
    float  absscale ;               /* scale relative to world */
    angle3  minangles ;             /* minimum angular constraints */
    angle3  maxangles ;                     /* maximum angular constraints */
    pos3   minpos ;                 /* minimum positional constraints */
    pos3              maxpos ;              /* maximum positional constraints */
     char    attributes[256] ;      /* copy of attributes from swivel */
     long    isaacAttrs[10] ;       /* attributes within issac */
     char    objectname[20] ;       /* name of object from swivel */
     long    objectformtype;        /* form type, default is polymesh */
         short       objectrender;          /* render flags */
         short       objectrenderstyle;     /* style of shading */
     float   objectcolor[3];        /* rgb color of object */
    polymesh objectmesh ;           /* polymesh describing object */
        /* polymesh is variable size and MUST BE LAST */
} IsObject  ;

typedef struct FileObject {                 /* File Object definition */
     long    objectversion ;        /* version starts with 1  */
     long    objectsize  ;          /* size of record in bytes */
     long    objectindex ;          /* swivels index for this object */
     long    materialindex ;        /* Object's material ID */
         long        uptree ;               /* tree indeces */
     long    downtree ;
     long    righttree  ;
     long    lefttree  ;
     long    isaacPtrs [6] ;        /* array of pointers to other records */
     cube    relcube ;              /* relative bounding cube */
     pos3    relpos ;               /* position relative to parent */
     angle3  relangles ;            /* orientation relative to parent */
     float   relscale ;             /* scale relative to parent */
     cube    abscube;               /* absolute cube*/
     pos3    abspos ;               /* position relative to world */
     angle3  absangles ;            /* orientation relative to world */
     float   absscale ;             /* scale relative to world */
     angle3  minangles ;            /* minimum angular constraints */
     angle3  maxangles ;            /* maximum angular constraints */
     pos3    minpos ;               /* minimum positional constraints */
     pos3              maxpos ;             /* maximum positional constraints */
      char    attributes[256] ;     /* copy of attributes from swivel */
      long    isaacAttrs [10] ;     /* attributes within issac */
      char    objectname[20] ;      /* name of object from swivel */
      long    objectformtype;       /* form type, default is polymesh */
          short       objectrender;         /* render flags */
          short       objectrenderstyle;    /* style of shading */
```

```
    float   objectcolor[3];          /* rgb color of object */
    polymesh objectmesh ;            /* polymesh describing object */
        /* polymesh is variable size and MUST BE LAST!!! */
} FileObj;
```

envisionfiles.h Sat, Apr 14, 1990 5

```
/****************************************************************

  EtherCom.c - This has the routines to support TCP/ethernet stuff
 on the SGI and to do the communications to a Mac running BodyElectric.

  © 1989 VPL Research, Inc.
   Chuck Blanchard 5/1/89

   Modified 11/30/89 by Young Harvill
          in CheckHeader:
          1. FILEVERSION and MINFILEVERSION are used to check incoming files
          2. The test to see if offset2data is = 256 is removed.

          in ReadFile:
          1. OBJECTVERSION AND MINOBJECTVERSION are used to validate objects.
          2. Routines which accessed the SGIObject field were removed.
 Modified 12/21/89 by Michael Teitel
          Removed all SGI specific calls and put them in sgi.c or sgi.h

****************************************************************/

#include <stdio.h>
#include <sys/types.h>
#include <sys/socket.h>
#include <sys/errno.h>
#include <netinet/in.h>
#include <netinet/udp.h>
#include <arpa/inet.h>
#include <netdb.h>
#include <gl.h>
#include <cg2vme.h>
#include <addrs.h>
#include <get.h>
#include <fcntl.h>
#include <malloc.h>
#include "envisionfiles.h"
#include "envision.h"
#include "sgi.h"
#include "globals.h"

#define MAXHOSTNAME          32
#define BACKLOG              5
#define BIGBUF               2048
#define MAXSTRING   255

extern NodeInfoType    NodeInfo[];

struct sockaddr_in sin, sout;      /* socket structures */
```

```
int sock, lenin, lenout;

int first_packet = TRUE;/* flag set until first packet recvd */
int sched_draw = FALSE;          /* set to schedule render on slow machine */
int calib_open = FALSE;          /* flag set when calib window open */
int fileopen = FALSE; /* flag set when transfer file open */
long cal_win;                    /* calibration, window identifier */
float Occular = 2.25; /* Inter-Occular X distance. (inches) */
short righteye = TRUE;           /* Calculate views for Right eye */
FILE *fileptr;                   /* temporary file pointer */

IsObject *JamWorldPtr;           /* node to track the world with */
IsObject *NameSearch(IsObject*, char*);

/******************
 All packets have a standard header. For now it is three words.
  <Packet len>, <Packet opcode>, <Packet who>.
  PAC_LEN, PAC_OP and PAC_WHO assume you are indexing into an array of short.
  PAC_HEADSIZE is the size in words, not bytes.
        ******************/

#define PAC_LEN      0
#define PAC_OP       1
#define PAC_WHO      2
#define PAC_HEADSIZE 3
#define AFTER_HEAD   3

/* MAC_PAC is the packet number for the mac. */
#define MAC_PAC      100

/* The following constants define the packet opcodes. */
#define ERROR_op     0xffff
#define No_op            0
#define OK_op            1
#define SendTree_op  3
#define Change_op    4
#define WakeUp_op    5
#define Quit_op          6
#define View_op          7
#define Eye_op           8
#define EyeDone_op   9
#define LoadFile_op      10
#define SetNTSC_op       11
#define SetRGB_op        12
#define PutFile_op       13
#define ChangeAttr_op    14

typedef struct {
```

```
    short       macNum;
    char        name[22];
    short       upIdx;
    short       downIdx;
    short       rightIdx;
    short       rbIdx;
    short       SixAxis[6];
    Byte        flags;
    Byte        unused;
} BE_NodeType;

typedef struct {
    short       BEindex;
    short       SixAxis[6];
} BE_ChangeType;

typedef struct {
    short       BEindex;
    short       clrbits_short1;
    short       clrbits_short0;
    short       setbits_short1;
    short       setbits_short0;
} ATR_ChangeType;

struct {
    IsObject    *nodeptr;
} BElookup[MAX_NODES];

short   OK_packet[] = { PAC_HEADSIZE*2, OK_op, MAC_PAC };
short   ERROR_packet[] = { PAC_HEADSIZE*2, ERROR_op, MAC_PAC };

/*********
Set the i'th sixAxis with the given value.
***********/

SetSixAxis(nptr,i,  value)
IsObject    *nptr;
int     i, value;
{
    switch (i) {
    case 0:
        nptr->relpos.xpos = value;
        break;
    case 1:
        nptr->relpos.ypos = value;
        break;
    case 2:
        nptr->relpos.zpos = value;
```

```
    break;
  case 3:
      nptr->relangles.ayaw = value / 10.0;
    break;
  case 4:
      nptr->relangles.apitch = value / 10.0;
    break;
  case 5:
      nptr->relangles.aroll = value / 10.0;
    break;
  }
}

void
CalcObjMatrix(n)
IsObject *n;
{
     pushmatrix();
     loadmatrix(idmat);
    /* translate to object space */
     translate(n->relpos.xpos, n->relpos.ypos, n->relpos.zpos);
     rot (n->relangles.ayaw,'y');
     rot (n->relangles.apitch,'x'); /* set object's attitude */
     rot (n->relangles.aroll,'z');
     scale(n->relscale, n->relscale, n->relscale); /* scale to object space */
     getmatrix(n->objmat);
     popmatrix();
}

/*****************************************************************
  Read_BEtree() - The entire BE tree has been read in and
  is pointed to by buffptr. Interpret the tree and build an
  array of BodyElectric indicies to nodes.
*****************************************************************/
/***************
 Read packet headsize in bytes = packet headsize in words * 2
 plus 2 bytes for the number of nodes in the packet.
     ***************/

#define READ_HEADSIZE  ((PAC_HEADSIZE * 2) + 2)

Read_BEtree(buffptr)
short     *buffptr;
{
   int           i, nodenum, nodecount;
   int            bufflen;
   BE_NodeType    *BEptr;
```

```
bufflen = buffptr[PAC_LEN];
buffptr += PAC_HEADSIZE;

nodecount = *buffptr++;

if ((sizeof(BE_NodeType) * nodecount + READ_HEADSIZE) != bufflen) {
        printf("Read_BEtree: got invalid packet size to nodecount. %d to %d.\n",
             bufflen, nodecount);
        return  (-1);
}
if (nodecount > MAX_NODES) {
        printf("Read_BEtree: node count %d to large.", nodecount);
        return  (-1);
}
if (debug)
        printf("Read_BEtree: nodecount: %d\n", nodecount);

/* Read all the nodes in. */
for (nodenum = 0; nodenum < nodecount; nodenum++) {
        IsObject        *nptr;

        BEptr = (BE_NodeType *) buffptr;
        buffptr = (short *) ((long) buffptr + sizeof(BE_NodeType));

        /* look for a node with this name */
        nptr = NameSearch(ROOT_NODE, BEptr->name);
        if (debug) {
            if (nptr == NULL)
                  printf("Read_BEtree: name '%s' not found\n", BEptr->name);
           else
                  printf("Read_BEtree: macNum= %d, name '%s'\n",
                         BEptr->macNum, BEptr->name);
        }
        if (nptr) {
            BElookup[BEptr->macNum].nodeptr = nptr;           /* found it, set lookup
                                                                * table */
            for (i = 0; i < 6; i++)          /* and current orientation. */
                  SetSixAxis(nptr, i, BEptr->SixAxis[i]);
             CalcObjMatrix(nptr);
        }
}
 return noErr;
}                                       /* Read_BEtree */

/*************************************************************
  Read_BEChange() - buffptr points to a list of nodes that
  have changed since the last Read_BEChange. run the list
  and change the local coordinates of the affected nodes.
```

```
            ************************************************************/

Read_BEChange(buffptr)
short    *buffptr;
{
   int            j;
   short          *buffend;
   IsObject       *nptr;
   BE_ChangeType  *beptr;

   buffend = (short *) ((long) buffptr + buffptr[PAC_LEN]);
   buffptr += PAC_HEADSIZE;

   while (buffptr < buffend) {

           /* Get the delta change header */
           beptr = (BE_ChangeType *) buffptr;

           buffptr = (short *) ((long) buffptr + sizeof(BE_ChangeType));
           nptr = BElookup[beptr->BEindex].nodeptr;
           if (nptr) {
               for (j = 0; j < 6; j++)
                       SetSixAxis(nptr, j, beptr->SixAxis[j]);
               CalcObjMatrix(nptr);
           } else if (debug)
               printf("Read_BEChange: Node %d not found.\n",
                       beptr->BEindex);
   }
   return noErr;
}                                          /* Read_BEChange */

/************************************************************
   Read_ATRChange() - buffptr points to a list of nodes whose
   attributes have changed since the last Read_ATRChange.
   Run the list and change the attributes of the affected nodes.
            ************************************************************/

Read_ATRChange(buffptr)
short    *buffptr;
{
   short          *buffend;
   IsObject       *nptr;
   ATR_ChangeType *attrptr;

   buffend = (short *) ((long) buffptr + buffptr[PAC_LEN]);
   buffptr += PAC_HEADSIZE;

   while (buffptr < buffend) {
```

```
        /* Get the delta change header */
        attrptr = (ATR_ChangeType *) buffptr;

        buffptr = (short *) ((long) buffptr + sizeof(ATR_ChangeType));
        nptr = BElookup[attrptr->BEindex].nodeptr;

        if (nptr) {
            nptr->objectrender &= ~(attrptr->clrbits_short0);
            nptr->objectrenderstyle &= ~(attrptr->clrbits_short1);
            nptr->objectrender |= attrptr->setbits_short0;
            nptr->objectrenderstyle |= attrptr->setbits_short1;
        } else if (debug)
          printf("Read_ATRChange: Node %d not found.\n",
                 attrptr->BEindex);
  }
  return noErr;
}                                       /* Read_ATRChange */

/*********************************************************
  File I/O stuff.
*********************************************************/

/* Read Issac files */

/**********************
Check to see if this seems to be a reasonable file header. Return
true if it is, else false.
**********************/

int    CheckHeader(hp)
IsHeader    *hp;
{
    if ((hp->fileversion != FILEVERSION) && (hp->fileversion != MINFILEVERSION)) {
          printf("CheckHeader: Bad file version #ld.\n", hp->fileversion);
          return FALSE;
    }
    if (strlen(hp->isname) > MAX_FNAME_LEN) {
          printf("CheckHeader: File name to long.  '%s'\n", hp->isname);
          return FALSE;
    }
    return TRUE;
}

/******************
SwivIdx2Ptr() - Given a swivel index, return the 'C' pointer for it.
If the index is zero or doesn't exist return NULL.
******************/
```

```
IsObject  *SwIdx2Ptr(swidx)
long    swidx;
{
   int       i;

    if (!swidx) return NULL;

    for (i=0; i<= topNodeIndex; i++)
        if (NodeInfo[i].swivIndex == swidx)
           return NodeInfo[i].nodeptr;

   return NULL;
}        /* SwivIdx2Ptr */

/********************
FixObject
  Turn Swivel indeces into 'C' pointers
  AND calculate object matrices
*********************/
char *
FixObject(n)
IsObject *n;
{
     n->uptree = SwIdx2Ptr((long)n->uptree);
     n->downtree = SwIdx2Ptr((long)n->downtree);
      n->righttree = SwIdx2Ptr((long)n->righttree);
      n->lefttree = SwIdx2Ptr((long)n->lefttree);
     CalcObjMatrix(n);
     return(NULL);
} /* FixObject */


/*********************
 ReadFile() - Read the Issac file from "fp".
 Build an internal tree and fix up all the tree pointers.
 Fill the global data structures mainHeader, NodeInfo and set the topNodeIndex.
 RJW - changed to allow differences in internal representation.
 Calls FileObj2IsObj to translate.
********************/

ReadFile(fp)
FILE       *fp;
{
   IsObject             *nodeptr;
   FileObj  fileobj;
   FileObj  *fobj; /* may point to auto OR heap storage */
   int         i, err, count;
   unsigned             allocsize, readsize;
```

```
if (debug)
        printf("ReadFile  entered\n");

/* NULL all the nodes. */
for (i = 0; i < MAX_NODES; i++)
        BElookup[i].nodeptr = NULL;

 if ((err = fseek(fp, 0l, 0)) != 0) {        /* make sure at beginning
                                               * of file */
        printf("fseek  error  #%d.\n", err);
        return  (-1);
}
/* Read the header in and check to see if it looks reasonable. */
 if ((count = fread(&mainHeader, sizeof(IsHeader), 1, fp)) != 1) {
        printf("fread of file header only read %d items.\n", count);
        return  (-1);
}
 if (!CheckHeader(&mainHeader))
        return  (-1);

topNodeIndex = -1;

 if (debug)
        printf("File header name = '%s'\n", mainHeader.isname);

 /* Now read all the objects from the file. */
 fseek(fp, mainHeader.offset2data, 0);
do {                                  /*  while(TRUE)  */
        /* Note: reads "objectversion" AND "objectsize" */
        count = fread(&fileobj.objectversion, sizeof(long), 2, fp);
        if (count != 2)                   /* assume the end of the file was reached. */
           break;

        if ((fileobj.objectversion != OBJECTVERSION) && (fileobj.objectversion !=
MINOBJECTVERSION)) {
             printf("ReadFile: Bad object version %ld.\n", fileobj.objectversion);
             return (-1);
        }
        / *
         * Objects have variable-length polymesh at end. Determine runtime
         * size.
         */
        allocsize = fileobj.objectsize - (sizeof(FileObj) - sizeof(IsObject));

        /* allocate memory for this node. */
        nodeptr = (IsObject *) malloc(allocsize);
        if (nodeptr == NULL) {
```

```
            printf("ReadFile: malloc failed on size %ld.\n", allocsize);
            return (-1);
        }
        fobj = &fileobj; /* use auto storage by default */
        /* Check for object larger than default maximum */
        if (fileobj.objectsize > sizeof(FileObj)) {
            fobj = (FileObj *) malloc(fileobj.objectsize);
            if (fobj == NULL) {
                printf("ReadFile: malloc failed on size %ld.\n", allocsize);
                free(nodeptr);
                return  (-1);
            }
            /* Copy the two members we have already */
            fobj->objectversion = fileobj.objectversion;
            fobj->objectsize = fileobj.objectsize;
        }
        /* read the node from the file into where fobj points to */
        readsize = fileobj.objectsize - (sizeof(long) * 2);
        count = fread(&fobj->objectindex, readsize, 1, fp);
        if (count != 1) {
            printf("ReadFile: fread of node %d returned %d.\n",
                    topNodeIndex + 1, count);
              printf("ferror = %d.\n", ferror(fp));
             return (-1);
        }
        /* Translate from external to internal format */
        FileObj2IsObj(fobj, nodeptr);
        if(fobj != &fileobj)
            free(fobj); /* clean up heap */

        if (debug)
            printf("Read node #%ld, '%s'.\n",
                    fobj->objectindex, fobj->objectname);
        if (debug)
            printf(" cull value: %ld \n", nodeptr->objectrender);
        topNodeIndex++;
        NodeInfo[topNodeIndex].nodeptr = nodeptr;
        NodeInfo[topNodeIndex].swivIndex = nodeptr->objectindex;
    } while (TRUE);

    /* Now turn the up,down,left and right obj indexes into pointers. */
    /* Now also pre-computes object matrices */
    PreFixWalk(ROOT_NODE, FixObject);
    return noErr;
}                                           /* ReadFile */

/**************************************************************
Put_File is passed a pointer to the received packet.
```

```
The packet is formated as follows:

          PAC_LEN                     (2 bytes)
          PAC_OP = Put_File_op        (2 bytes)
          PAC_WHO                     (2 bytes)
          lastpacket          (2 bytes) = -1 => TRUE, = 0 => Otherwise
          filename            (n bytes)
          filedata            (m bytes)

**********************************************************/

Put_File(bufptr)
short  bufptr[];
{
   char        *file;
   short       lastpacket;
   char         *charptr, *buffend;

    lastpacket = *((char *) &bufptr[AFTER_HEAD]);     /* true if the last
                                                                  * packet */
    file = (char *) ((long) &bufptr[AFTER_HEAD] + sizeof(short));

    if (!fileopen) {
          printf("PutFile: filename: %s\n", file);
          if ((fileptr = fopen(file, "w")) == NULL) {
              fprintf(stderr, "%s: unable to open %s\n", myname, file);
              return -1;
          }
          fileopen = TRUE;
   }
     charptr = (char *) ((long) &bufptr[AFTER_HEAD] + sizeof(short) + strlen(file));
    buffend = (char *) ((long) bufptr + bufptr[PAC_LEN]);

    while (++charptr < buffend)
          fputc(*charptr,  fileptr);        /* ought to use fwrite here? */

    if (lastpacket) {
          fclose(fileptr);
          fileopen = FALSE;
   }
    return noErr;
}                                          /*  Put_File  */

Read_NewFile(world, filename)
short world;
char *filename;
{
   FILE        *fptr;
```

```
    int ret;

     if ((fptr = fopen(filename, "r")) == NULL) {
             fprintf(stderr, "%s: %s not found\n", myname, filename);
             ret = -1;
   } else {
             PostFixWalk(ROOT_NODE, free);              /* free memory in old tree */
             /* Future: clear only if world == -1 */
             JamWorldPtr = 0;     /* clear View object pointer */
             ret = ReadFile(fptr);
             fclose(fptr);
   }
      return(ret);
}

/***********************************************************
  Ethernet stuff.
***********************************************************/

/**************
 SendPacket() - send the given packet.
     **************/

SendPacket(packet)
short      packet[];
{
    char          *cp;
    int           j, k;

     j = sendto(sock, packet, packet[PAC_LEN], 0, (struct sockaddr *) &sout,
                         lenout);
      if (j == -1) {
              perror("sendto");
              exit(1);
     }
     if (debug) {
              printf("*Write* size: %d len: %d opcode: %d\n",
                         j, packet[0], packet[1]);
              cp = (char *) &packet[0];
              for (k = 0; k < j; k++)
                    printf("%d:", *(cp + k));
              printf("\n");
     }
 }                                          /* SendPacket */

 /*************
 InitEther() - initialize network
  InitEther() - Program just started up. Initialize and open the
```

```
  ethernet connection to the mac.
        ***********/
InitEther()
{
    struct servent *sp;

    /* Initialize BITNET (set SGIDONE) */
    if (hardsync) {
            InitHardsync();
    }
    lenin = sizeof(sin);
    lenout = sizeof(sout);

    if ((sp = getservbyname("VPLUDP", "udp")) == NULL) {
            fprintf(stderr, "VPL network not available\n");
            exit(1);
    }
    sin.sin_addr = inet_makeaddr(INADDR_ANY, 0);
    sin.sin_port = sp->s_port;

    if ((sock = socket(AF_INET, SOCK_DGRAM, 0)) == -1) {
            perror("socket");
            exit(1);
    }
    if (bind(sock, (struct sockaddr *) & sin, sizeof(sin)) == -1) {
            perror("bind");
            exit(1);
    }
}                                       /* InitEther */

/****************
 CheckEther() - Called from within the IdiotSav main loop.  Check to see
   if there is any Ethernet communication and if so handle it, otherwise
  do nothing.
        ****************/
CheckEther()
{
    int         k, size, ret, world;
    short       buf[BIGBUF];
    char        *cp, *filename;

    size = recvfrom(sock, buf, BIGBUF, 0, (struct sockaddr *) &sin, &lenin);
    if(size != -1) {      /* there is data */
            if (debug) {
                printf("Read size: %d len: %d opcode: %d\n",
                        size, buf[PAC_LEN], buf[PAC_OP]);
                cp = (char *) &buf[PAC_LEN];
                for (k = 0; k < size; k++)
```

```
                printf("%d:", *(cp + k));
            printf("\n");
        }
        if ((size != buf[PAC_LEN]) || (size == 0)) {
            printf("Invalid Packet, %d <> %d\n", size, buf[PAC_LEN]);
            return;
        }
        if (first_packet) {
            sout = sin;
            first_packet = FALSE;
            if (fcntl(sock, F_SETFL, FNDELAY) < 0) {
                perror("fnctl F_SETFL, FNDELAY");
                exit(1);
            }
        }
} else {
        /* no data */
        if (errno != EWOULDBLOCK) {
            perror("recvfrom");
            exit(1);
        }
        buf[PAC_OP] = No_op;            /* No packet recvd so do nothing */
        if (sched_draw) {      /* Async slow SGI mode */
            DrawWorld();
            swapbuffers();
            sched_draw = FALSE;
            framecount++;
        }
}

 switch (buf[PAC_OP]) {

case No_op:                     /* No packets pending */
        break;

case Change_op:                 /* The usual case */
        if (hardsync)
            ClearHardsync();  /* clr bit, I'm busy */
        if (hardsync || softreply)
            swapbuffers();    /* sync flip */
        ret = Read_BEChange(buf);       /* change tree */
        if (hardsync || softreply) {
            DrawWorld();      /* render new. */
            framecount++;     /* update framecount */
        } else
            sched_draw = TRUE;          /* schedule async update */
        if (softreply)
            SendPacket(OK_packet);      /* Send back OK. */
```

```
        if  (hardsync)
            SetHardsync();      /* set bit, I'm done */
        break;

    case ChangeAttr_op:
        ret = Read_ATRChange(buf); /* change attributes of nodes in tree */
        SendPacket(OK_packet);          /* Send back OK. */
        break;

    case SendTree_op:           /* new tree come in. */
        ret = Read_BEtree(buf);         /* Interpret new tree */
        DrawWorld();                    /* Render but no page flip. */
        SendPacket(OK_packet);          /* Send back OK. */
        break;

    case WakeUp_op:
        SendPacket(OK_packet);          /* Tell MAC OK */
        break;

    case View_op:
        View(buf);
        SendPacket(OK_packet);          /* Send back OK. */
        break;

    case Eye_op:                /* Calibrate Inter-ocular */
        Occular = buf[AFTER_HEAD] / EYE_UNITS_PER_IN;
        DrawCal();
        SendPacket(OK_packet);
        break;

    case EyeDone_op:            /* End calibration */
        CloseCalib();
        SendPacket(OK_packet);
        break;

    case LoadFile_op:
        world = buf[AFTER_HEAD];
        filename = (char *) &buf[AFTER_HEAD + 1];
        printf("LoadFile_op: filename: %s loaded\n", filename);
        ret = Read_NewFile(world, filename);
        if(ret == noErr)
            SendPacket(OK_packet);      /* Send back OK. */
        else
            SendPacket(ERROR_packet);   /* Send back ERROR */
        break;

    case PutFile_op:
        if (Put_File(buf) == noErr)
```

```
            SendPacket(OK_packet);          /* Send back OK. */
        else
            SendPacket(ERROR_packet);       /* Send back ERROR. */
        break;

    case SetNTSC_op:
        setntsc();
        SendPacket(OK_packet);              /* Send back OK. */
        break;

    case SetRGB_op:
        setrgb();
        SendPacket(OK_packet);              /* Send back OK. */
        break;

    case Quit_op:
        Finished = TRUE;
        printf("Bye.\n");
        break;

    case OK_op:
    default:
        printf("Got invalid packet type %d.", buf[PAC_OP]);
    }                                       /* switch */
}                                           /* CheckEther */
```

```
/*****************************************************************

   fileobj2isobj.c - convert FileObj data type to IsObj data type

   © 1990 VPL Research, Inc.
    Richard Walker 1/9/90
*****************************************************************/

#include <stdio.h>
#include <gl.h>

#include "envisionfiles.h"
#include "envision.h"
#include "sgi.h"
#include "globals.h"

FileObj2IsObj(fobj, iobj)
FileObj *fobj;
IsObject *iobj;
{
    int         rows, cols;

    /* Note - these are fixed later by FixPointers */
    iobj->uptree = (IsObject *) fobj->uptree;
    iobj->downtree = (IsObject *) fobj->downtree;
    iobj->righttree = (IsObject *) fobj->righttree;
    iobj->lefttree = (IsObject *) fobj->lefttree;

    iobj->objectversion = fobj->objectversion;
    iobj->objectsize = fobj->objectsize;
    iobj->objectindex = fobj->objectindex;
    iobj->materialindex = fobj->materialindex;
     memcpy(&iobj->isaacPtrs[0], &fobj->isaacPtrs[0], sizeof(iobj->isaacPtrs));
    iobj->relcube = fobj->relcube;
    iobj->relpos = fobj->relpos;
    iobj->relangles = fobj->relangles;
    iobj->relscale = fobj->relscale;
    iobj->abscube = fobj->abscube;
    iobj->abspos = fobj->abspos;
    iobj->absangles = fobj->absangles;
    iobj->absscale = fobj->absscale;
    iobj->minangles = fobj->minangles;
    iobj->maxangles = fobj->maxangles;
    iobj->minpos = fobj->minpos;
    iobj->maxpos = fobj->maxpos;
      memcpy(&iobj->attributes[0], &fobj->attributes[0], sizeof(iobj->attributes));
```

```
    memcpy(&iobj->isaacAttrs[0], &fobj->isaacAttrs[0], sizeof(iobj->isaacAttrs));
    memcpy(&iobj->objectname[0], &fobj->objectname[0], sizeof(iobj->objectname));
    iobj->objectformtype = fobj->objectformtype;
    iobj->objectrender = fobj->objectrender;
    iobj->objectrenderstyle = fobj->objectrenderstyle;
    memcpy(&iobj->objectcolor[0], &fobj->objectcolor[0], sizeof(iobj->objectcolor));

    rows = iobj->objectmesh.rows = fobj->objectmesh.rows;
    cols = iobj->objectmesh.columns = fobj->objectmesh.columns;
    if (rows && cols) {
        /* Copy polymesh vertices. This is the variable-length part! */
        memcpy(iobj->objectmesh.meshverts, fobj->objectmesh.meshverts,
            rows * cols * sizeof(vertex));
    }
}
```

```
#include <stdio.h>
#include <gl.h>
#include <math.h>
#include "envisionfiles.h"
#include "envision.h"


/********************************
  Globals
********************************/

extern NodeInfoType    NodeInfo[];    /* for */

/* window globals */
long worldwin ;

/* drawtree globals */

Matrix idmat = {1.0, 0.0, 0.0, 0.0,       /* identity matrix */
            0.0, 1.0, 0.0, 0.0,
            0.0, 0.0, 1.0, 0.0,
            0.0, 0.0, 0.0, 1.0,
          };

Coord  polymat[256][3];                         /* polygon temp array */

/* fixed colors */
float backcolor  [3] = { 0.5, 0.5, 0.8 };
float blackcolor [3] = { 0.0, 0.0, 0.0 };
float whitecolor [3] = { 1.0, 1.0, 1.0 };

float  *wirecolor;      /* pointer to default wireframe color */
float  wcolor[3];       /* write color temp storage */

/* material list */

SGIMaterial            MaterialList[MATNUM];

/* Light List */

SGILight    LightList[LIGHTSNUM];

/* universal material */

float unimaterial [] =
    { DIFFUSE, 0.8, 0.8, 0.8,
      EMISSION, 0.0, 0.0, 0.0,
     LMNULL };
```

```
float warmtoplight []=
   { LCOLOR, 1.0, 0.97, 0.9,
     POSITION, 0.4, 0.5,0.6,0.0,
    LMNULL };

float coolunderlight []=
   { LCOLOR, 0.6, 0.4, 0.5,
      POSITION,  -0.4, -0.5,-0.6,0.0,
    LMNULL };

#ifdef UNUSED

/* cube normals */

float top_normal [3]     = { 0.0, 1.0, 0.0 } ;
float bottom_normal [3] = { 0.0, -1.0, 0.0 } ;
float front_normal [3]  = { 0.0, 0.0, -1.0 } ;
float back_normal [3]   = { 0.0, 0.0, 1.0 } ;
float right_normal [3]  = { 1.0, 0.0, 0.0 } ;
float left_normal [3]    = { -1.0, 0.0, 0.0 } ;

/* poly sides */
float p0[3], p1[3], p2[3], p3[3] ;

#endif /* UNUSED */
```

globals.h Sat, Apr 14, 1990 1

```
/********************************
  Globals
********************************/

extern NodeInfoType   NodeInfo[];    /* for */

/* window globals */
extern long worldwin ;

/* drawtree globals */

extern Matrix idmat;
extern Coord polymat[256][3];                  /* polygon temp array */

/* fixed colors */

extern float backcolor  [3];
extern float blackcolor [3];
extern float whitecolor [3] ;

extern float *wirecolor;         /* pointer to default wireframe color */
extern float wcolor[3];          /* write color temp storage */

/* material list */

extern SGIMaterial     MaterialList[MATNUM];

/* Light List */

extern SGILight        LightList[LIGHTSNUM];

/* universal material */
extern float unimaterial [] ;
extern float warmtoplight [];
extern float coolunderlight [];

#ifdef UNUSED

/* cube normals */
extern float top_normal []    ;
extern float bottom_normal [] ;
extern float front_normal [] ;
extern float back_normal [] ;
extern float right_normal []  ;
extern float left_normal []   ;

/* poly sides */
extern float p0[], p1[], p2[], p3[] ;
```

globals.h Sat, Apr 14, 1990 2

```
#endif /* UNUSED */
```

```
#include <signal.h>

main(argc,argv)
int argc;
char **argv;
{
    int pid;

     argc--, argv++;
    while(argc) {
          pid = atoi(*argv);
          if(pid > 1)
              kill(pid, SIGTERM);
          argc--,  argv++;
   }
    exit(0);
}
```

```
/****************************************************************

  RManDraw.c renders Isaac objects with Renderman calls
  © Young Harvill, 1989 VPL Research, Inc.
   8/15/89

****************************************************************/


#include <stdio.h>
#include <math.h>
#include <stdio.h>
#include "envisionfiles.h"
#include "envision.h"
#include "/usr/rman/reyes/include/ri.h"


/********************************
   Globals
********************************/


extern NodeInfoType   NodeInfo[];     /* for */
RtPoint PointList [100];
RtPoint NormalList [100];


/******************************************************
   Object drawing
******************************************************/


RmDrawFlat(n, i)
IsObject *n;
long   i;
{
   long j;
   long col ;
   long nextcol, thiscol ;
   long a, b, c, d;


    col = n->objectmesh.columns;
    thiscol = i * col;
    nextcol = (i + 1) * col;

     for ( j = 0; j <(col-1); j++) {
         /* draw a phong shaded poly in the mesh */
```

```
        a = thiscol + j;
        b = a + 1;
        d = nextcol + j;
        c = d + 1;

                PointList[0][0]  = (n->objectmesh.meshverts[a].meshpoint[0]);
                PointList[0][1]  = (n->objectmesh.meshverts[a].meshpoint[1]);
                PointList[0][2]  = (n->objectmesh.meshverts[a].meshpoint[2]);

                PointList[1][0]  = (n->objectmesh.meshverts[b].meshpoint[0]);
                PointList[1][1]  = (n->objectmesh.meshverts[b].meshpoint[1]);
                PointList[1][2]  = (n->objectmesh.meshverts[b].meshpoint[2]);

                PointList[2][0]  = (n->objectmesh.meshverts[c].meshpoint[0]);
                PointList[2][1]  = (n->objectmesh.meshverts[c].meshpoint[1]);
                PointList[2][2]  = (n->objectmesh.meshverts[c].meshpoint[2]);

                PointList[3][0]  = (n->objectmesh.meshverts[d].meshpoint[0]);
                PointList[3][1]  = (n->objectmesh.meshverts[d].meshpoint[1]);
                PointList[3][2]  = (n->objectmesh.meshverts[d].meshpoint[2]);

        RiPolygon( 4,"P",PointList,RI_NULL);
        }
}


RmDrawSmooth(n,i)
IsObject *n;
long    i;
{
   long j;
   long col ;
   long nextcol, thiscol ;
   long a, b, c, d;


   col = n->objectmesh.columns;
   thiscol     = i * col;
   nextcol = (i + 1) * col;

    for ( j = 0; j <(col-1); j++) {
        /* draw a phong shaded poly in the mesh */

        a = thiscol + j;
        b = a + 1;
        d = nextcol + j;
        c = d + 1;
```

```
                    PointList[0][0]  =  (n->objectmesh.meshverts[a].meshpoint[0]);
                    PointList[0][1]  =  (n->objectmesh.meshverts[a].meshpoint[1]);
                    PointList[0][2]  =  (n->objectmesh.meshverts[a].meshpoint[2]);
                    NormalList[0][0]  =  (n->objectmesh.meshverts[a].meshnormal[0]);
                    NormalList[0][1]  =  (n->objectmesh.meshverts[a].meshnormal[1]);
                    NormalList[0][2]  =  (n->objectmesh.meshverts[a].meshnormal[2]);

                    PointList[1][0]  =  (n->objectmesh.meshverts[b].meshpoint[0]);
                    PointList[1][1]  =  (n->objectmesh.meshverts[b].meshpoint[1]);
                    PointList[1][2]  =  (n->objectmesh.meshverts[b].meshpoint[2]);
                    NormalList[1][0]  =  (n->objectmesh.meshverts[b].meshnormal[0]);
                    NormalList[1][1]  =  (n->objectmesh.meshverts[b].meshnormal[1]);
                    NormalList[1][2]  =  (n->objectmesh.meshverts[b].meshnormal[2]);

                    PointList[2][0]  =  (n->objectmesh.meshverts[c].meshpoint[0]);
                    PointList[2][1]  =  (n->objectmesh.meshverts[c].meshpoint[1]);
                    PointList[2][2]  =  (n->objectmesh.meshverts[c].meshpoint[2]);
                    NormalList[2][0]  =  (n->objectmesh.meshverts[c].meshnormal[0]);
                    NormalList[2][1]  =  (n->objectmesh.meshverts[c].meshnormal[1]);
                    NormalList[2][2]  =  (n->objectmesh.meshverts[c].meshnormal[2]);

                    PointList[3][0]  =  (n->objectmesh.meshverts[d].meshpoint[0]);
                    PointList[3][1]  =  (n->objectmesh.meshverts[d].meshpoint[1]);
                    PointList[3][2]  =  (n->objectmesh.meshverts[d].meshpoint[2]);
                    NormalList[3][0]  =  (n->objectmesh.meshverts[d].meshnormal[0]);
                    NormalList[3][1]  =  (n->objectmesh.meshverts[d].meshnormal[1]);
                    NormalList[3][2]  =  (n->objectmesh.meshverts[d].meshnormal[2]);

            RiPolygon(  4,"P",PointList,"N",NormalList,RI_NULL);
    }
}

/* drawsection  draws one band of triangular polys in a polymesh */

RmSection  (n,i)
IsObject  *n;
long    i;
{

    switch  (n->objectrenderstyle) {
            case FLATSH:
                RmDrawFlat(n,i);
              break;
            case WIRE:
                RmDrawFlat(n,i);
              break;
            case FILLED_WIRE:
```

```
            RmDrawFlat(n,i);
            break;
        case FLAT_and_WIRE:
            RmDrawFlat(n,i);
            break;
        case SMOOTH:
            RmDrawSmooth(n,i);
            break;
  }

}                                   /* drawsection      */


RmFrontCap (n, i)
IsObject *n;
long   i;

{
        long j ;
  long col ;
   RtInt GenVerts[1];

   col = n->objectmesh.columns;
   for ( j = 0; j < (col-1); j++)
  {
        ./* all points but last */
        PointList[j][0] = ( n->objectmesh .meshverts[col+j].meshpoint[0] );
                PointList[j][1] = ( n->objectmesh .meshverts[col+j].meshpoint[1] );
                PointList[j][2] = ( n->objectmesh .meshverts[col+j].meshpoint[2] );
  }
        GenVerts[0]=  (col-1);
    RiGeneralPolygon( 1,GenVerts,"P",PointList,RI_NULL);

}     /* RmFrontCap */


RmBackCap (n, i)
IsObject *n;
long   i;
{
   long j ;
   long col ;
        RtInt GenVerts[1];

   col = n->objectmesh.columns;
    for ( j = (col-2); j >(-1); j--)    /* decrement for proper winding order */
```

```
  {
          /* loop through dem points */

        PointList[j][0] = ( n->objectmesh .meshverts[(i * col)+j ].meshpoint[0] ) ;
                     PointList[j][1] = ( n->objectmesh .meshverts[(i * col)+j ].meshpoint[1] )
;
                     PointList[j][2] = ( n->objectmesh .meshverts[(i * col)+j ].meshpoint[2] )
;
  }
   GenVerts[0]= (col-1);
   RiGeneralPolygon( 1,GenVerts,"P",PointList,RI_NULL);

}  /* RmBackCap */


/* drawmesh draws meshes and handles front and back caps being set */

RmDrawMesh(n)
IsObject *n;

{
   long   i;
   long row ;
    row = n->objectmesh.rows;

    if ((n->objectrender) & FCAP)          /* check and draw the front cap */
       RmFrontCap(n);
   else
       RmSection (n,0);                 /* else use mesh section */

    if ( row > 3 )
    {
        for ( i = 1; i <(row-2); i++)        /* loop through mid sections ...*/
          RmSection (n,i);
    }

    if ( row > 2 )
    {
        if ((n->objectrender) & BCAP)        /* draw backcap if there is one */
           RmBackCap(n,row-2);
      else
           RmSection (n,row-2);                        /* else finish with mesh */
    }

 }  /* RmDrawMesh */
```

```
/*  DrawObject sets the coordinates space for an object and draws it */

RmDrawObject(n)
IsObject *n;
{
          RtColor ObColor;
          ObColor[0] = n->objectcolor[0];
          ObColor[1] = n->objectcolor[1];
          ObColor[2] = n->objectcolor[2];
    RiColor (ObColor);
    RmDrawMesh(n);                      /* draw the mesh */
}


/* Walk the tree,  drawing the objects that are visible */

RmDrawWalk(n)
IsObject *n;
{
    if (!n) return;
    if (!((n == JamWorldPtr) || (n->objectrender & INVISTREE_MASK)))
   {
    RiTransformBegin();


          /* translate to object space */
     RiTranslate(n->relpos.xpos, n->relpos.ypos, n->relpos.zpos);
     RiRotate  (n->relangles.ayaw,0.0,1.0,0.0);
      RiRotate  (n->relangles.apitch,1.0,0.0,0.0);
                    /* set object's attitude */
      RiRotate  (n->relangles.aroll,0.0,0.0,1.0);
     RiScale   (n->relscale, n->relscale, n->relscale);                          /* scale
to object space */
           if (!(n->objectrender & INVISOBJ_MASK))
                        RmDrawObject(n);
                                                         /*  Visible  */
           RmDrawWalk(n->downtree);
     RiTransformEnd();
   }
     RmDrawWalk(n->righttree);
}


/* SetViewObj sets the current viewing object matrix */

RmSetViewObj(n)
```

```
  IsObject *n;
{
  while( (n != ROOT_NODE) && (n != 0) )
  {
          RiScale      ( 1 / n->relscale,
          1 / n->relscale,
          1 / n->relscale);
          RiRotate        (-(n->relangles.aroll),0.0,0.0,1.0);
          RiRotate        (-(n->relangles.apitch),1.0,0.0,0.0);
          /* in reverse order */
          RiRotate     (-(n->relangles.ayaw),0.0,1.0,0.0);
          RiTranslate    (-(n->relpos.xpos),
            -(n->relpos.ypos),
            -(n->relpos.zpos));
              /* negative position */
          n = n->uptree;
  }
          RiScale      ( 1 / ROOT_NODE->relscale,
          1 / ROOT_NODE->relscale,
          1 / ROOT_NODE->relscale);
          RiRotate        (-(ROOT_NODE->relangles.aroll),0.0,0.0,1.0);
          RiRotate       (-(ROOT_NODE->relangles.apitch),1.0,0.0,0.0);      /* in reverse order */
          RiRotate     (-(ROOT_NODE->relangles.ayaw),0.0,1.0,0.0);
          RiTranslate   (-(ROOT_NODE->relpos.xpos),
          -(ROOT_NODE->relpos.ypos),
          -(ROOT_NODE->relpos.zpos));
          /* negative position */
}


          /* RmDrawWorld is the thing that renders it all */


RmDrawWorld()
{
           RiWorldBegin();
                     RiTransformBegin();
                                                                  /* root matrix of the
world */
                     RiScale  (1.0,1.0,-1.0);
                     RmSetViewObj(JamWorldPtr);
                     RmDrawWalk(ROOT_NODE->downtree);
                     RiTransformEnd();
           RiWorldEnd();
}
```

```
/* FrameCamera */

FrameCamera (focallen, framewid, frameht)
float focallen, framewid, frameht;
{
        float width,fov;
        RiProjection("perspective",RI_NULL);
        fov=(framewid*.5)/focallen;
        width= framewid/frameht;
        RiScreenWindow( -fov*width, fov*width, -fov, fov);
}

RmRenderScene()
{
        RiBegin();
                RiFormat( MAX_X,MAX_Y,1.0);
                RiFrameAspectRatio(SCREENWIDTH/SCREENHEIGHT);
                FrameCamera( SCREENDIST,SCREENWIDTH,SCREENHEIGHT);
                RiClipping((float)SCREENDIST,(float)FARCLIP);
                RmDrawWorld();
        RiEnd();

}
```

```
#include <stdio.h>
#include <sys/types.h>
#include <sys/errno.h>
#include <gl.h>
#include <get.h>
#include <gl/cg2vme.h>
#include <gl/addrs.h>

#include "envisionfiles.h"
#include "envision.h"
#include "sgi.h"

extern int first_packet;                    /* flag set until first packet recvd */
extern int sched_draw ;                     /* set to schedule render on slow machine
* /
extern int calib_open ;                     /* flag set when calib window open */
extern int fileopen;                        /* flag set when transfer file open */
extern long cal_win;               /* calibration window identifier */
extern float Occular ;             /* Inter-Occular X distance. (inches) */
extern short righteye ;                     /* Calculate views for Right eye */
extern FILE *fileptr;                       /* temporary file pointer */
extern Matrix idmat;

/*********************************************************
  Inter-Occular and Calibration stuff.
*********************************************************/

DrawCal()
{
    /* open initial calibrate window */
    if (!calib_open) {
            prefposition(0, MAX_X, 0, MAX_Y);
            cal_win = winopen("eye_cal");
            UpdateWindow(righteye, Occular);
            doublebuffer();
            RGBmode();
            gconfig();
            calib_open = TRUE;
    }
    /* display calibration graphics */
    if (righteye) {
            UpdateWindow(righteye, Occular);
            pushmatrix();
            translate(Occular * UNITS_PER_IN, 0, -FARAWAY);
            RGBcolor(30, 30, 100);
            clear();
            RGBcolor(255, 255, 255);
            circf(0, 0, 50);
```

```
  } else {
          UpdateWindow(righteye, Occular);
          pushmatrix();
          translate(-Occular * UNITS_PER_IN, 0, -FARAWAY);
          RGBcolor(30, 30, 100);
          clear();
          RGBcolor(255, 255, 255);
          resetls(TRUE);
          linewidth(CALIB_LINEWIDTH);
          rect(-5, 50, 5, 250);
          resetls(TRUE);
          linewidth(DEFAULT_LINEWIDTH);
  }
   swapbuffers();
  if (debug)
          printf("DRAWCAL: righteye: %d, Occular: %f (inches)\n",
               righteye, Occular);
   popmatrix();
}

/* close calibration window and set perspective on image window*/
CloseCalib()
{
   winclose(cal_win);
  calib_open = FALSE;
   winset(worldwin);
   UpdateWindow(righteye, Occular);
  if (debug)
          printf("Close Calibration window\n");
}

UpdateWindow(Eye,Occ)
int Eye;           /* 1 for righteye else 0 for left eye */
float Occ;  /* inter occular distance */
{
   if (Eye) {
          window(SCREENSEP / 2 - Occ * UNITS_PER_IN,
               (SCREENSEP / 2 + SCREENWIDTH) - Occ * UNITS_PER_IN,
               -SCREENHEIGHT / 2, SCREENHEIGHT / 2, SCREENDIST, FARCLIP);
  } else {
          window(Occ * UNITS_PER_IN - (SCREENSEP / 2 + SCREENWIDTH),
               Occ * UNITS_PER_IN - SCREENSEP / 2,
               -SCREENHEIGHT / 2, SCREENHEIGHT / 2, SCREENDIST, FARCLIP);
  }
}

void setntsc()
{
```

```
    setmonitor(NTSC);
    if (genlock) {
            if (getvideo(CG_MODE) != -1)
                setvideo(CG_MODE, CG2_M_MODE1);
    } else if (getvideo(CG_MODE) != -1) {
            setvideo(CG_MODE, CG2_M_MODE2);
            setvideo(DE_R1, DER1_UNBLANK | DER1_G_170);
    }
}

void setrgb()
{
    setmonitor(HZ60);
    if (getvideo(CG_MODE) != -1)
            setvideo(CG_MODE, CG2_M_MODE4);
    setvideo(DE_R1, DER1_UNBLANK | DER1_60HZ | DER1_SYNCG);
}

/**********************
InitWS();
Initialize SGI Window system
***********************/

InitWS()
{
    static Cursor NullCurs;
#ifdef PROFILE
    foreground();               /* this is only so that the process stays
                                 * in foreground for profiling */
#endif /* PROFILE */

    blanktime(0);               /* Turn off screen blanking */
    keepaspect((long) SCREENWIDTH, (long) SCREENHEIGHT);
    prefposition(0, MAX_X, 0, MAX_Y);
    worldwin = winopen("world");
    RGBmode();
    doublebuffer();
    gconfig();
    lsetdepth(0, 0x7FFFFF);
    zbuffer(TRUE);
    resetls(TRUE);
    linewidth(DEFAULT_LINEWIDTH);
    backface(FALSE);
    /* RJW 1/23/90 define NULL cursor to turn it off */
    if(!mouse) {
            defcursor(1,NullCurs);
            setcursor(1,0,0);
    }
```

```
}

InitPerspective()
{
   mmode(MVIEWING);                    /* set matrix viewing mode */
    loadmatrix(idmat);                 /* get a matrix for the top of the stack */

   /* set some default perspective view ( not stereo at init time) */
   window(-(SCREENWIDTH / 2), (SCREENWIDTH / 2),
          -(SCREENHEIGHT / 2), (SCREENHEIGHT / 2), SCREENDIST, FARCLIP);
}
```

sgi.h Sat, Apr 14, 1990 1

```
/*************************************************
This file contains SGI specific code
*************************************************/

/**********
general for getbutton
**********/

#define getkey(key)  getbutton(key)

/*******************************************************
        Clean up any graphics stuff i.e. for SGI reset blanktime
*******************************************************/

#define CloseDrawing()     blanktime(15*3600)                /* Set screen
blanking for 15 min */

/***********
set up hardsync
*************/

#define InitHardsync()              setvideo(CG_CONTROL, 0x00); setvideo(CG_CONTROL,
0x01)
#define ClearHardsync()         setvideo(CG_CONTROL, 0x00)
#define SetHardsync()               setvideo(CG_CONTROL, 0x01)
```

What is claimed is:

1. A simulating apparatus comprising:

modeling means for creating a model of a physical environment in a computer database;

first body sensing means, disposed in close proximity to a part of a first body, for sensing a physical status of the first body part relative to a first reference position;

second body sensing means, disposed in close proximity to a part of a second body, for sensing a physical status of the second body part relative to a second reference position;

first body emulating means, coupled to the first body sensing means, for creating a first cursor in the computer database, the first cursor including plural first cursor nodes and emulating the physical status of the first body part, the first body emulating means including a first point hierarchy and a first data flow network, the first point hierarchy for controlling a shape and an orientation of the first cursor and for attaching each of the plural first cursor nodes hierarchically with at least one other of the plural first cursor nodes, the first data flow network for controlling motion of the first cursor and the first data flow network including a first interconnection of first input units, first function units and first output units, the first input unity receiving the physical status of the first body part, each first function unit including at least one input and at least one output and calculating, based on the at least one input, a value for each of the at least one output, and the first output units for producing position and orientation values for a portion of the plural first cursor nodes;

first integrating means, coupled to the modeling means and to the first emulating means, for integrating the first cursor with the model;

second body emulating means, coupled to the second body sensing means, for creating a second cursor in the computer database, the second cursor including plural second cursor nodes and emulating the physical status of the second body part, the second body emulating means including a second point hierarchy and a second data flow network, the second point hierarchy for controlling a shape and an orientation of the second cursor and for attaching each of the plural second cursor nodes hierarchically with at least one other of the plural second cursor nodes, the second data flow network for controlling motion of the second cursor and the second data flow network including a second interconnection of second input units, second function units and second output units, the second input units receiving the physical status of the second body part, each second function unit including at least one input and at least one output and calculating, based on the at least one input, a value for each of the at least one output, and the second output units for producing position and orientation values for a portion of the plural second cursor nodes; and second integration means, coupled to the modeling means and to the second body emulating means, for integrating the second cursor with the model.

2. The apparatus according to claim 1 further comprising first model display means for displaying a view of the model.

3. The apparatus according to claim 2 wherein the first model display means includes view changing means for changing the view of the model in response to a change in the physical status of the second cursor in the model.

4. The apparatus according to claim 3 wherein the second cursor includes a first optical axis which moves together therewith, and wherein the view of the model produced by the first model display means corresponds to the view taken along the first optical axis.

5. The apparatus according to claim 4 wherein the first model display means displays the first cursor together with the model when the first optical axis faces the location of the first cursor.

6. The apparatus according to claim 5 wherein the first cursor depicts the first body part being emulated.

7. The apparatus according to claim 1 wherein the model includes a virtual object, and further comprising first object manipulating means, coupled to the first body emulating means, for manipulating the virtual object with the first cursor in accordance with corresponding gestures of the first body part.

8. The apparatus according to claim 7 further comprising second object manipulating means, coupled to the second body emulating means, for manipulating the virtual object with the second cursor in accordance with corresponding gestures of the second body part.

9. The apparatus according to claim 8 further comprising first model display means for displaying a view of the model.

10. The apparatus according to claim 9 wherein the first model display means includes view changing means for changing the view of the model in response to a change in the physical status of the second cursor in the model.

11. The apparatus according to claim 10 wherein the second cursor includes an optical axis which moves together therewith, and wherein the view of the model corresponds to the view taken along the optical axis.

12. The apparatus according to claim 11 wherein the first model display means displays the first cursor together with the model when the optical axis faces the location of the first cursor.

13. The apparatus according to claim 12 wherein the first cursor depicts the first body part being emulated.

14. The apparatus according to claim 13 wherein the first model display means displays the second cursor together with the model when the optical axis faces the location of the second cursor.

15. The apparatus according to claim 14 wherein the second cursor depicts the second body part being emulated.

16. The apparatus according to claim 15 further comprising second model display means for displaying a view of the model, the view of the model changing in response to the physical status of the first cursor in the model.

17. The apparatus according to claim 16 wherein the first cursor includes a second optical axis which moves together therewith, and wherein the view of the model produced by the second model display means corresponds to the view taken along the second optical axis.

18. The apparatus according to claim 17 wherein the second model display means displays the second cursor together with the model when the second optical axis faces the location of the second cursor.

19. The apparatus according to claim 18 wherein the first body part is a part of a body of a first human being.

20. The apparatus according to claim 19 wherein the first model display means comprises a first head-mounted display.

21. The apparatus according to claim 20 wherein the first head-mounted display comprises:

a first display for displaying the model to a first eye; and a second display for displaying the model to a second eye.

22. The apparatus according to claim 1 wherein the first and second displays together produce a stereophonic image.

23. The apparatus according to claim 21 wherein the first head-mounted display further comprises:

a first audio display for displaying a sound model to a first ear; and a second audio display for displaying the sound model to a second ear.

24. The apparatus according to claim 21 wherein the first and second displays display the model as a series of image frames, and wherein the model display means further comprises frame synchronization means, coupled to the first and second displays, for synchronizing the display of the series of frames to the first and second displays.

25. The apparatus according to claim 19 wherein the second body part is a part of a body of a second human being.

26. A simulating apparatus comprising:

a modeling means for creating a virtual world model of a physical environment in a computer database;

a first sensor for sensing a first real world parameter;

first emulating means, coupled to the first sensor for emulating a first virtual world phenomenon in the virtual world model, the first emulating means including a first point hierarchy and a first data flow network, the first point hierarchy for controlling a shape and an orientation of a first cursor, including plural first cursor nodes, and for attaching each of the plural first cursor nodes hierarchically with at least one other of the plural first cursor nodes, the first data flow network for controlling motion of the first cursor and the first data flow network including a first interconnection of first input units, first function units and first output units, the first input units receiving the physical status of the first body part, each first function unit including at least one input and at least one output and calculating, based on the at least one input, a value for each of the at least one output, and the first output units for producing position and orientation values for a portion of the plural first cursor nodes;

a second sensor for sensing a second real world parameter; and second emulating means, coupled to the second sensor, for emulating a second virtual world phenomenon in the virtual world model, the second emulating means including a second point hierarchy and a second data flow network, the second point hierarchy for controlling a shape and an orientation of a second cursor, including plural second cursor nodes, and for attaching each of the plural second cursor nodes hierarchically with at least one other of the plural second cursor nodes, the second data flow network for controlling motion of the second cursor and the second data flow network including a second interconnection of second input units, second function units and second output units, the second input units receiving the physical status of the second body part, each second function unit including at least one input and at least one output and calculating, based on the at least one input, a value for each of the at least one output, and the second output units for producing position and orientation values for a portion of the plural second cursor nodes.

27. An apparatus according to claim 21, wherein the first body sensing means includes a facial expression sensor using conductive ink.

28. An apparatus according to claim 1, wherein the first body sensing means includes a facial expression sensor including a strain gauge.

29. An apparatus according to claim 1, wherein the first body sensing means includes a pneumatic input device.

30. A simulating method, comprising the steps of:

creating a virtual environment;

constructing virtual objects within the virtual environment using a point hierarchy and a data flow network for controlling motion of nodes of the virtual objects wherein the step of constructing includes attaching each node of the virtual objects hierarchically with at least one other of the nodes to form the point hierarchy, each of the nodes of the virtual objects having a position and an orientation, and building the data flow network as an interconnection of input units, function units and output units, wherein said input units receive data from sensors and output the received data to at least one of said function units, wherein each of said function units includes at least one input and at least one output, each function unit generating a value for the at least one output based on at least one of data received from at least one of the input units and data received from an output of at least one other of said function units, and wherein the output units generate the position and the orientation of a portion of the nodes of the virtual objects;

inputting data from sensors worn on bodies of at least two users;

converting the inputted data to position and orientation data;

modifying by using the data flow network, the position and the orientation of the nodes of the virtual objects based on the position and orientation data;

determining view points of said at least two users;

receiving a synchronization signal;

calculating image frames for each eye of each of said at least two users;

displaying the image frames to each of said eyes of said at least two users;

obtaining updated position and orientation values of said at least two users;

determining if the virtual environment has been modified;

redefining positions and orientations of the nodes of the virtual object if the virtual environment has been modified;

recalculating the image frames for each of said eyes of said at least two users; and displaying the recalculated image frames to each of said eyes of said at least two users.

* * * * *